US012602510B2

(12) United States Patent
Cella et al.

(10) Patent No.: US 12,602,510 B2
(45) Date of Patent: Apr. 14, 2026

(54) TRUST SCORES AND SECURITY IN TRUSTLESS INTERACTIONS BASED ON DIGITAL LEDGER ADDRESSES

(71) Applicant: STRONG FORCE TX PORTFOLIO 2018, LLC, Fort Lauderdale, FL (US)

(72) Inventors: Charles Howard Cella, Fort Lauderdale, FL (US); Brad Kell, Fort Lauderdale, FL (US); Mehul Desai, Fort Lauderdale, FL (US); Teymour S. El-Tahry, Fort Lauderdale, FL (US)

(73) Assignee: STRONG FORCE TX PORTFOLIO 2018, LLC, Fort Lauderdale, FL (US)

(*) Notice: Subject to any disclaimer, the term of this patent is extended or adjusted under 35 U.S.C. 154(b) by 0 days.

(21) Appl. No.: 18/207,485

(22) Filed: Jun. 8, 2023

(65) Prior Publication Data

US 2023/0351393 A1 Nov. 2, 2023

Related U.S. Application Data

(63) Continuation of application No. PCT/US2022/050937, filed on Nov. 23, 2022.
(Continued)

(30) Foreign Application Priority Data

Feb. 18, 2022 (IN) ............................ 202211008634

(51) Int. Cl.
*G06Q 20/36* (2012.01)
*G06F 21/44* (2013.01)
(Continued)

(52) U.S. Cl.
CPC .......... *G06F 21/6245* (2013.01); *G06F 21/44* (2013.01); *G06N 3/08* (2013.01);
(Continued)

(58) Field of Classification Search
None
See application file for complete search history.

(56) References Cited

U.S. PATENT DOCUMENTS

| | | | |
|---|---|---|---|
| 8,224,872 | B2 | 7/2012 | Dettinger et al. |
| 8,412,560 | B1 | 4/2013 | Masud et al. |

(Continued)

FOREIGN PATENT DOCUMENTS

| | | | |
|---|---|---|---|
| AU | 2021107272 | A4 | 12/2021 |
| CA | 3178485 | A1 | 11/2021 |

(Continued)

OTHER PUBLICATIONS

Agrawal, R., "Connecting Public and Private Blockchains," https://ravikantagrawal.medium.com/connecting-public-and-private-blockchains-5fc951222852, Feb. 2020, 4 pages.

(Continued)

*Primary Examiner* — Patrick McAtee
*Assistant Examiner* — Jason B Fenstermacher
(74) *Attorney, Agent, or Firm* — RMCK Law Group, PLC

(57) ABSTRACT

Systems and methods for transaction platforms include various systems interacting with each other and transacting in various ways. A method for configuring and launching a marketplace includes: identifying, by a processing system having one or more processors, an opportunity to facilitate configuration of a new marketplace; receiving marketplace opportunity data, wherein the marketplace opportunity data includes information related to a set of assets of one or more types; determining configuration parameters to be implemented in the new marketplace; determining the feasibility of implementing the configuration parameters in the new marketplace; determining data resources to support the new marketplace; determining an architecture of the new mar-
(Continued)

ketplace; determining the configuration of the data resources in a data model for the marketplace; configuring a marketplace object; connecting selected data resources to populate the marketplace object; and launching the new marketplace.

20 Claims, 291 Drawing Sheets

Related U.S. Application Data

(60) Provisional application No. 63/381,546, filed on Oct. 28, 2022, provisional application No. 63/392,083, filed on Jul. 25, 2022, provisional application No. 63/302,014, filed on Jan. 21, 2022, provisional application No. 63/299,703, filed on Jan. 14, 2022, provisional application No. 63/291,306, filed on Dec. 17, 2021, provisional application No. 63/282,502, filed on Nov. 23, 2021.

(51) Int. Cl.

| | |
|---|---|
| ***G06F 21/62*** | (2013.01) |
| ***G06N 3/08*** | (2023.01) |
| ***G06Q 20/08*** | (2012.01) |
| ***G06Q 20/10*** | (2012.01) |
| ***G06Q 20/22*** | (2012.01) |
| ***G06Q 20/38*** | (2012.01) |
| ***G06Q 20/40*** | (2012.01) |
| ***G06Q 30/0201*** | (2023.01) |
| ***G06Q 30/0202*** | (2023.01) |
| ***G06Q 30/0207*** | (2023.01) |
| ***G06Q 30/0601*** | (2023.01) |
| ***G06Q 40/00*** | (2023.01) |
| ***G06Q 40/04*** | (2012.01) |
| ***H04L 9/40*** | (2022.01) |
| ***H04L 43/0852*** | (2022.01) |
| *G06Q 40/03* | (2023.01) |

(52) U.S. Cl.

CPC ......... *G06Q 20/0855* (2013.01); *G06Q 20/10* (2013.01); *G06Q 20/223* (2013.01); *G06Q 20/36* (2013.01); *G06Q 20/3672* (2013.01); *G06Q 20/3674* (2013.01); *G06Q 20/382* (2013.01); *G06Q 20/3825* (2013.01); *G06Q 20/3829* (2013.01); *G06Q 20/40* (2013.01); *G06Q 20/4016* (2013.01); *G06Q 20/405* (2013.01); *G06Q 30/0202* (2013.01); *G06Q 30/0206* (2013.01); *G06Q 30/0209* (2013.01); *G06Q 30/0609* (2013.01); *G06Q 40/00* (2013.01); *G06Q 40/04* (2013.01); *H04L 43/0852* (2013.01); *H04L 63/00* (2013.01); *G06Q 40/03* (2023.01); *G06Q 2220/00* (2013.01)

(56) References Cited

U.S. PATENT DOCUMENTS 9,633,076 B1 4/2017 Morton et al.
9,892,460 B1 2/2018 Winklevoss et al.
9,898,782 B1 2/2018 Winklevoss et al.
9,917,781 B2 3/2018 Roach et al.
10,275,772 B2 4/2019 Ronca et al.
10,523,716 B1 * 12/2019 Stickle .................... H04L 41/28
10,701,163 B2 6/2020 Sharma et al.
10,878,505 B1 12/2020 Blair et al.
10,929,053 B2 2/2021 Bernat et al.
10,936,585 B1 3/2021 Echeverria et al.
11,099,902 B1 8/2021 Matthews et al.
11,106,477 B2 8/2021 Miller et al.
11,139,955 B1 10/2021 So et al.
11,164,254 B1 11/2021 Gordon, III et al.
11,257,089 B2 2/2022 Eller et al.
11,269,808 B1 3/2022 Yuan et al.
11,308,487 B1 4/2022 Foster et al.
11,334,543 B1 5/2022 Anwar et al.
11,334,883 B1 5/2022 Auerbach et al.
11,418,361 B2 8/2022 Seo et al.
11,487,850 B1 11/2022 Nieto et al.
11,522,700 B1 12/2022 Auerbach et al.
11,604,795 B2 3/2023 Pal et al.
11,611,488 B2 3/2023 Yoon
11,615,104 B2 3/2023 Pal et al.
11,620,303 B1 4/2023 Roy et al.
11,625,260 B2 4/2023 Jang et al.
11,636,105 B2 4/2023 Pal et al.
11,641,409 B2 5/2023 Rogynskyy et al.
11,647,091 B2 5/2023 Rogynskyy et al.
11,663,227 B2 5/2023 Pal et al.
11,769,214 B1 9/2023 Kasper
12,093,942 B1 9/2024 Auerbach et al.
12,105,761 B2 10/2024 Tsantilas et al.
2002/0032626 A1 3/2002 Dewolf et al.
2002/0120727 A1 8/2002 Curley et al.
2003/0149719 A1 8/2003 Wang
2005/0289123 A1 12/2005 Dettinger et al.
2008/0043716 A1 2/2008 Toombs et al.
2008/0172323 A1 7/2008 Feilbogen et al.
2009/0119515 A1 5/2009 Nicolson et al.
2009/0210369 A1 8/2009 Shao et al.
2010/0250378 A1 * 9/2010 Bjoraker ................ G06Q 20/28
705/16
2010/0250497 A1 9/2010 Redlich et al.
2011/0277037 A1 11/2011 Burke et al.
2012/0102566 A1 4/2012 Vrancken et al.
2012/0265625 A1 10/2012 Pletz et al.
2013/0159295 A1 6/2013 Gross
2015/0142829 A1 5/2015 Lee et al.
2015/0363783 A1 * 12/2015 Ronca .................. G06Q 20/382
705/71
2016/0164787 A1 6/2016 Roach et al.
2016/0239831 A1 * 8/2016 Saunders ........... G06Q 20/4016
2016/0378843 A1 12/2016 Cherwonka et al.
2017/0041296 A1 2/2017 Ford et al.
2017/0046670 A1 * 2/2017 Arjomand .......... G06Q 30/0279
2017/0075778 A1 3/2017 Heliker et al.
2017/0161737 A1 6/2017 Benson et al.
2017/0161746 A1 6/2017 Cook et al.
2018/0041426 A1 2/2018 Hasek, IV
2018/0091316 A1 3/2018 Stradling et al.
2018/0101560 A1 4/2018 Christidis et al.
2018/0176244 A1 6/2018 Gervais et al.
2018/0181641 A1 6/2018 Das et al.
2018/0248895 A1 8/2018 Watson et al.
2019/0012660 A1 1/2019 Masters
2019/0057225 A1 2/2019 Thomas et al.
2019/0068627 A1 2/2019 Thampy
2019/0080392 A1 3/2019 Youb et al.
2019/0137989 A1 5/2019 Cella et al.
2019/0138639 A1 5/2019 Pal et al.
2019/0138640 A1 5/2019 Pal et al.
2019/0138641 A1 5/2019 Pal et al.
2019/0147084 A1 5/2019 Pal et al.
2019/0147085 A1 5/2019 Pal et al.
2019/0147086 A1 5/2019 Pal et al.
2019/0147092 A1 5/2019 Pal et al.
2019/0155533 A1 5/2019 Das et al.
2019/0236559 A1 8/2019 Padmanabhan
2019/0266355 A1 8/2019 Lockhart, III et al.
2019/0272271 A1 9/2019 Bhattacharjee et al.
2019/0282906 A1 9/2019 Yong
2019/0303926 A1 10/2019 Yantis et al.
2019/0310977 A1 10/2019 Pal et al.
2019/0362024 A1 11/2019 Brousseau et al.
2019/0370233 A1 12/2019 Yamashita et al.
2019/0370813 A1 12/2019 Bravick et al.
2019/0373472 A1 12/2019 Smith et al.
2020/0005264 A1 1/2020 Patterson et al.

(56) References Cited

U.S. PATENT DOCUMENTS

| | | | |
|---|---|---|---|
| 2020/0036515 | A1 | 1/2020 | Chari et al. |
| 2020/0042996 | A1* | 2/2020 | Mayblum .............. G06Q 20/36 |
| 2020/0065802 | A1 | 2/2020 | Mathieson et al. |
| 2020/0065847 | A1 | 2/2020 | Harrison et al. |
| 2020/0074548 | A1 | 3/2020 | Aidoo et al. |
| 2020/0104930 | A1 | 4/2020 | Walden et al. |
| 2020/0118131 | A1 | 4/2020 | Diriye et al. |
| 2020/0162485 | A1* | 5/2020 | Jevans ...................... H04L 9/50 |
| 2020/0184464 | A1* | 6/2020 | Zagone ................ G06Q 20/322 |
| 2020/0184556 | A1 | 6/2020 | Cella |
| 2020/0219093 | A1 | 7/2020 | Malhotra et al. |
| 2020/0225655 | A1 | 7/2020 | Cella et al. |
| 2020/0250661 | A1 | 8/2020 | Padmanabhan et al. |
| 2020/0250717 | A1 | 8/2020 | Todd |
| 2020/0265155 | A1 | 8/2020 | Dong et al. |
| 2020/0278958 | A1 | 9/2020 | Zhang et al. |
| 2020/0285788 | A1 | 9/2020 | Brebner |
| 2020/0285991 | A1 | 9/2020 | Panda et al. |
| 2020/0294128 | A1 | 9/2020 | Cella |
| 2020/0294135 | A1 | 9/2020 | Cella |
| 2020/0322445 | A1 | 10/2020 | Dhanabalan et al. |
| 2020/0342539 | A1 | 10/2020 | Doney |
| 2020/0348662 | A1 | 11/2020 | Cella et al. |
| 2020/0364223 | A1 | 11/2020 | Pal et al. |
| 2020/0372154 | A1* | 11/2020 | Bacher .................. H04L 41/145 |
| 2020/0372624 | A1 | 11/2020 | Braun et al. |
| 2020/0389309 | A1 | 12/2020 | Ricotta et al. |
| 2020/0394220 | A1 | 12/2020 | Novotny et al. |
| 2021/0029123 | A1 | 1/2021 | Monteath et al. |
| 2021/0042162 | A1 | 2/2021 | Gopinath et al. |
| 2021/0042830 | A1 | 2/2021 | Burke |
| 2021/0049691 | A1 | 2/2021 | Howorka et al. |
| 2021/0092161 | A1 | 3/2021 | Crabtree et al. |
| 2021/0096919 | A1 | 4/2021 | Rajendran et al. |
| 2021/0144149 | A1 | 5/2021 | Simons |
| 2021/0158211 | A1 | 5/2021 | Talwar et al. |
| 2021/0201236 | A1 | 7/2021 | Makhija et al. |
| 2021/0216902 | A1 | 7/2021 | Sutcher-Shepard et al. |
| 2021/0263667 | A1 | 8/2021 | Whitlock et al. |
| 2021/0272109 | A1 | 9/2021 | Adeji |
| 2021/0295431 | A1 | 9/2021 | Vo et al. |
| 2021/0312291 | A1 | 10/2021 | Katz et al. |
| 2021/0342836 | A1 | 11/2021 | Cella et al. |
| 2021/0374741 | A1 | 12/2021 | Wood |
| 2021/0406276 | A1 | 12/2021 | Ramasamy |
| 2021/0409326 | A1 | 12/2021 | Mintz |
| 2022/0020018 | A1 | 1/2022 | Jivanyan et al. |
| 2022/0027896 | A1 | 1/2022 | Goldstein |
| 2022/0036461 | A1 | 2/2022 | Blair et al. |
| 2022/0044316 | A1 | 2/2022 | Gaur et al. |
| 2022/0051219 | A1 | 2/2022 | Sells et al. |
| 2022/0058516 | A1 | 2/2022 | Sarin |
| 2022/0076250 | A1 | 3/2022 | Gaur et al. |
| 2022/0101327 | A1 | 3/2022 | Arora et al. |
| 2022/0108262 | A1 | 4/2022 | Cella et al. |
| 2022/0122721 | A1 | 4/2022 | Alberico |
| 2022/0138842 | A1* | 5/2022 | Drucker ............. G06Q 20/4016 705/44 |
| 2022/0156663 | A1 | 5/2022 | Dua et al. |
| 2022/0253842 | A1 | 8/2022 | James et al. |
| 2022/0261385 | A1 | 8/2022 | Anwar et al. |
| 2022/0318418 | A1 | 10/2022 | Goel et al. |
| 2022/0327529 | A1 | 10/2022 | Williams et al. |
| 2022/0329479 | A1 | 10/2022 | Ramachandran et al. |
| 2022/0330078 | A1 | 10/2022 | Barchi et al. |
| 2022/0351188 | A1 | 11/2022 | Fukuhara et al. |
| 2022/0358336 | A1 | 11/2022 | Abolhasssani et al. |
| 2022/0377070 | A1 | 11/2022 | Bustos et al. |
| 2022/0414492 | A1 | 12/2022 | Jezewski |
| 2022/0414621 | A1 | 12/2022 | Parlotto et al. |
| 2022/0417323 | A1 | 12/2022 | Julien et al. |
| 2023/0011788 | A1 | 1/2023 | Wong et al. |
| 2023/0015846 | A1 | 1/2023 | Toffey et al. |
| 2023/0043702 | A1 | 2/2023 | Sells et al. |
| 2023/0073859 | A1 | 3/2023 | Matthews et al. |
| 2023/0092436 | A1 | 3/2023 | Gaur et al. |
| 2023/0107805 | A1 | 4/2023 | Summer |
| 2023/0137867 | A1 | 5/2023 | Walters et al. |
| 2023/0162174 | A1* | 5/2023 | Brasse ............... G06Q 20/4016 705/75 |
| 2023/0315872 | A1 | 10/2023 | Lally et al. |
| 2023/0334168 | A1 | 10/2023 | Kureshi et al. |
| 2024/0073156 | A1 | 2/2024 | Singh et al. |
| 2024/0129185 | A1 | 4/2024 | Shetye et al. |
| 2024/0135402 | A1 | 4/2024 | Cascio et al. |
| 2024/0171721 | A1 | 5/2024 | Peeters |
| 2024/0223615 | A1 | 7/2024 | Crabtree et al. |
| 2024/0250931 | A1 | 7/2024 | Seifert et al. |

FOREIGN PATENT DOCUMENTS

| | | | |
|---|---|---|---|
| CN | 105474166 | A | 4/2016 |
| CN | 111602116 | A | 8/2020 |
| EP | 3514715 | A1 | 7/2019 |
| EP | 3709309 | A1 | 9/2020 |
| EP | 3958158 | B1 | 4/2023 |
| KR | 20150053985 | A | 5/2015 |
| WO | 2014043420 | A1 | 3/2014 |
| WO | 2015091583 | A1 | 6/2015 |
| WO | 2016135705 | A1 | 9/2016 |
| WO | 2017127850 | A1 | 7/2017 |
| WO | 2018080832 | A1 | 5/2018 |
| WO | 2018201009 | A1 | 11/2018 |
| WO | 2019094729 | A1 | 5/2019 |
| WO | 2019144234 | A1 | 8/2019 |
| WO | 2019213752 | A1 | 11/2019 |
| WO | 2019217323 | A1 | 11/2019 |
| WO | 2020223332 | A1 | 11/2020 |
| WO | 2020232137 | A1 | 11/2020 |
| WO | 2020243961 | A1 | 12/2020 |
| WO | 2021030288 | A1 | 2/2021 |
| WO | 2021087475 | A1 | 5/2021 |

OTHER PUBLICATIONS

Bradley, M. et al., “Getting Started with Enterprise Blockchain—A Guide to Design and Development,” O’Reilly Media, Inc., IBM Corporation, Apr. 2019, 86 pages.

Cisco Internetworking Basics, “Understanding TCP/IP,” 2002, 7 pages.

Maizels, N., “Exploring Cross Chain Asset Technologies: CATA, CDEX, and CDAT,” Wanchain, https://medium.com/wanchain-foundation/exploring-cross-chain-asset-technologies-cata-cdex-and-cdat-a4c6212222db, Oct. 2019, 9 pages.

Panarello, A. et al., “Blockchain and IoT Integration: A Systematic Survey,” Sensors, vol. 18, No. 8:2575, www.mdpi.com/journal/sensors, Aug. 2018, pp. 1-37.

PCT International Search Report and Written Opinion dated Jun. 28, 2023 for International Application No. PCT/US2022/050937, 38 pages.

Sezer, O. et al., “Financial Trading Model with Stock Bar Chart Image Time Series with Deep Convolutional Neural Networks,” https://arxiv.org/abs/1903.04610, Mar. 2019, 15 pages.

U.S. Provisional Utility U.S. Appl. No. 63/216,320, filed Jun. 29, 2021, “Blockchain and Non-Fungible Token Application in Gaming Environment to Store and Track Digital Assets,” 9 pages.

Wanchain—Building Super Financial Markets for the New Digital Economy, Version 0.9.1., 2017, 34 pages.

Wanchain Commerce White Paper, Version 1.0.0, 2017, 21 pages.

Wanchain X-Rollup Light Paper, “X-Rollup: A Layer 2 Solution for Ethereum,” 2017, 13 pages.

U.S. Appl. No. 18/117,860, filed Mar. 6, 2023, Cella et al.

U.S. Appl. No. 18/118,220, filed Mar. 7, 2023, Cella et al.

U.S. Appl. No. 18/118,246, filed Mar. 7, 2023, Cella et al.

U.S. Appl. No. 18/118,261, filed Mar. 7, 2023, Cella et al.

U.S. Appl. No. 18/207,425, filed Jun. 8, 2023, Cella et al.

U.S. Appl. No. 18/207,450, filed Jun. 8, 2023, Cella et al.

U.S. Appl. No. 18/207,462, filed Jun. 8, 2023, Cella et al.

U.S. Appl. No. 18/207,787, filed Jun. 9, 2023, Cella et al.

U.S. Appl. No. 18/207,748, filed Jun. 9, 2023, Cella et al.

(56) References Cited

OTHER PUBLICATIONS

U.S. Appl. No. 18/207,759, filed Jun. 9, 2023, Cella et al.
U.S. Appl. No. 18/207,773, filed Jun. 9, 2023, Cella et al.
U.S. Appl. No. 18/207,801, filed Jun. 9, 2023, Cella et al.
U.S. Appl. No. 18/207,829, filed Jun. 9, 2023, Cella et al.
U.S. Appl. No. 18/242,737, filed Sep. 6, 2023, Cella et al.
U.S. Appl. No. 18/242,760, filed Sep. 6, 2023, Cella et al.
U.S. Appl. No. 18/242,788, filed Sep. 6, 2023, Cella et al.
U.S. Appl. No. 18/242,820, filed Sep. 6, 2023, Cella et al.
Antonopoulos, A., "Mastering Bitcoin—Unlocking Digital Crypto Currencies," Dec. 2014, 282 pages.
Rhodes, D., "CryptoNight: An Overview of the CryptoNight Mining Algorithm," Dec. 2023, https://komodoplatform.com/en/academy/cryptonight, 11 pages.
Shyamsukha, S. et al., "PoRF: Proof-of-Reputation-based Consensus Scheme for Fair Transaction Ordering," 13th International Conference on Electronics, Computers and Artificial Intelligence (ECAI), 2021, 6 pages.
Mahendra, S. et al., "Smart Security System for Businesses Using Internet of Things (IOT)," 2018 IEEE, Second International Conference on Green Computing and Internet of Things (ICGCIoT), https://ieeexplore.ieee.org/document/8753101, Aug. 2018, pp. 424-429.
Abid, A. et al., "Challenges and Issues of Resource Allocation Techniques in Cloud Computing," KSII Transactions On Internet And Information Systems, vol. 14, No. 7, Jul. 2020, pp. 2815-2839.
Colesky, M. et al., "A Critical Analysis of Privacy Design Strategies," 2016 IEEE Security and Privacy Workshops, 2016, pp. 33-40.
Extended European Search Report dated Feb. 21, 2025 for EP Application No. 22899405.9, 7 pages.
Azcoitia, S.A. et al., "A Survey of Data Marketplaces and Their Business Models," ARXIV ID: 2201.04561, https://doi.org/10.48550/arXiv.2201.04561, Jan. 2022, 24 pages.
Tanner, J. et al., "Technology Review of Blockchain Data Privacy Solutions," arXiv preprint arXiv:2105.01316, May 2021, 60 pages.

* cited by examiner

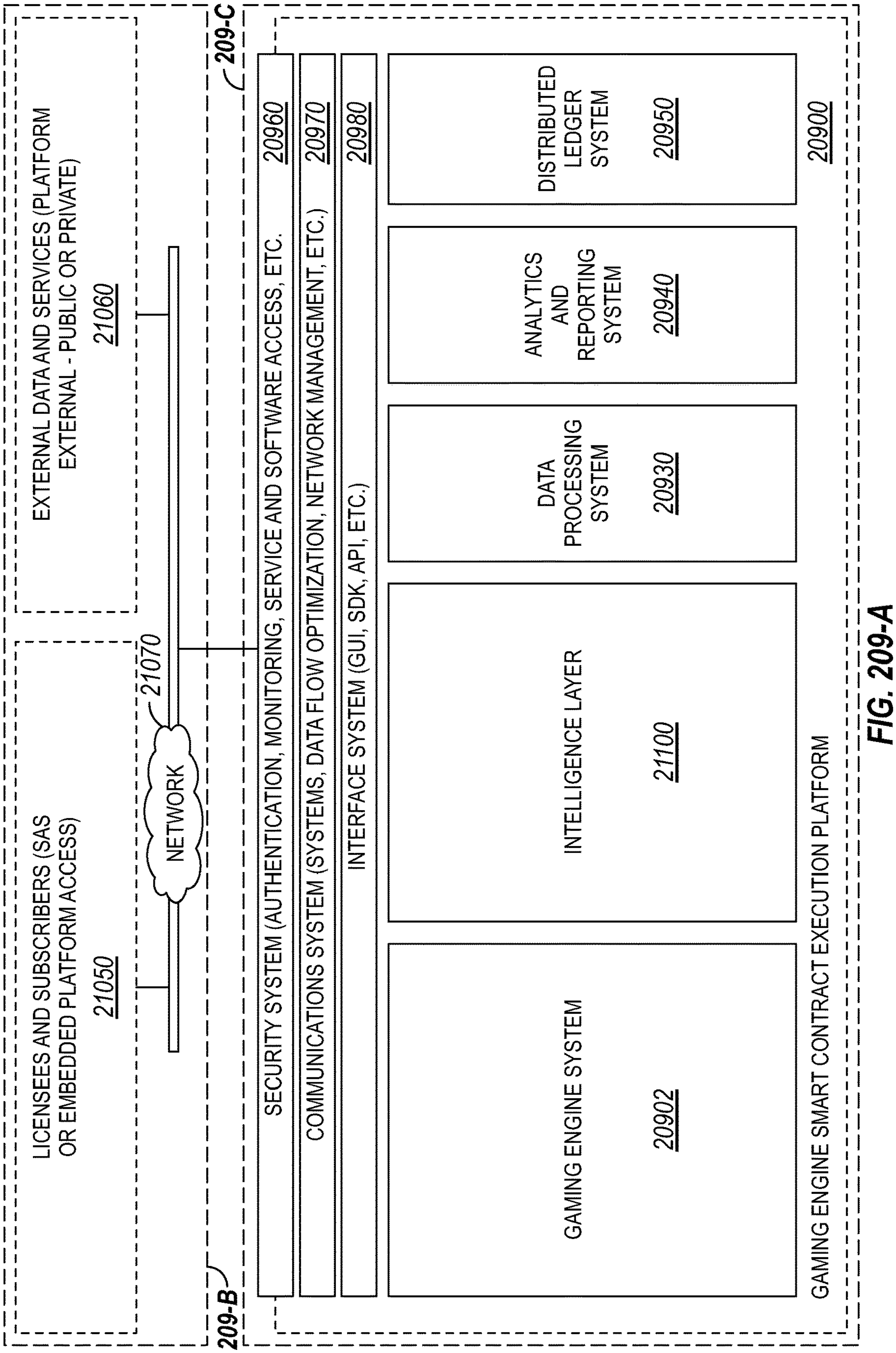
FIG. 209-A

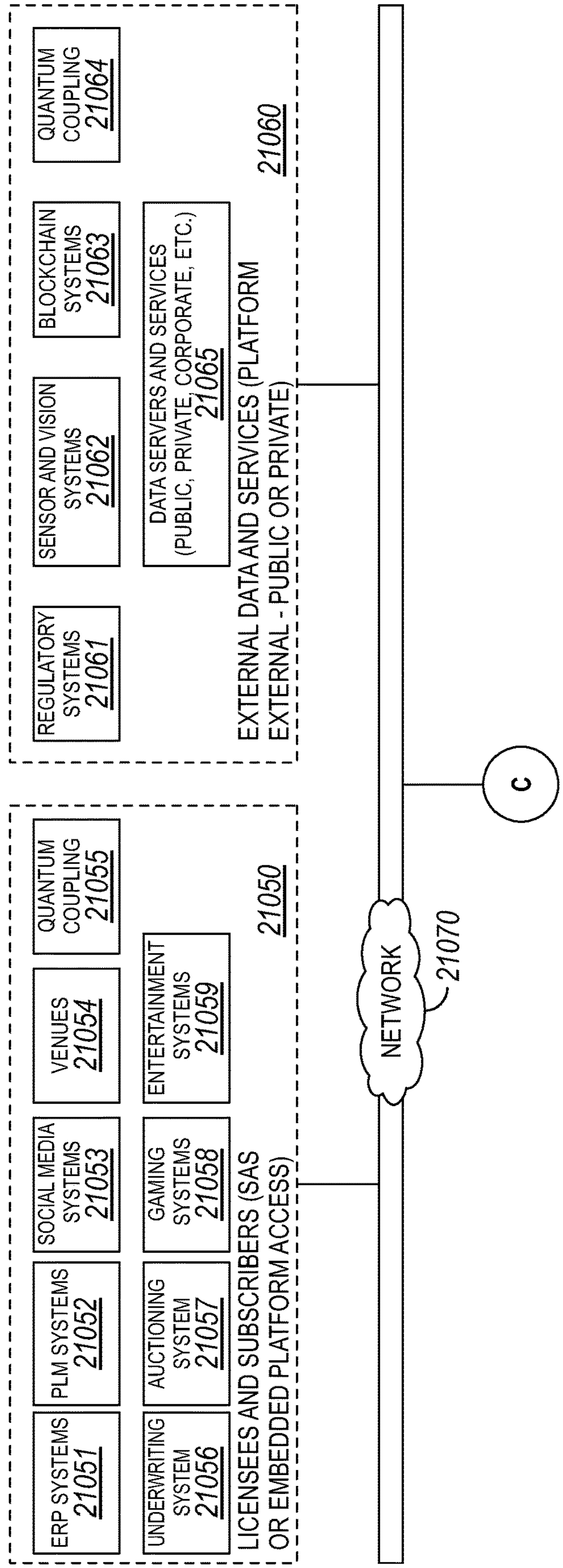
FIG. 209-B

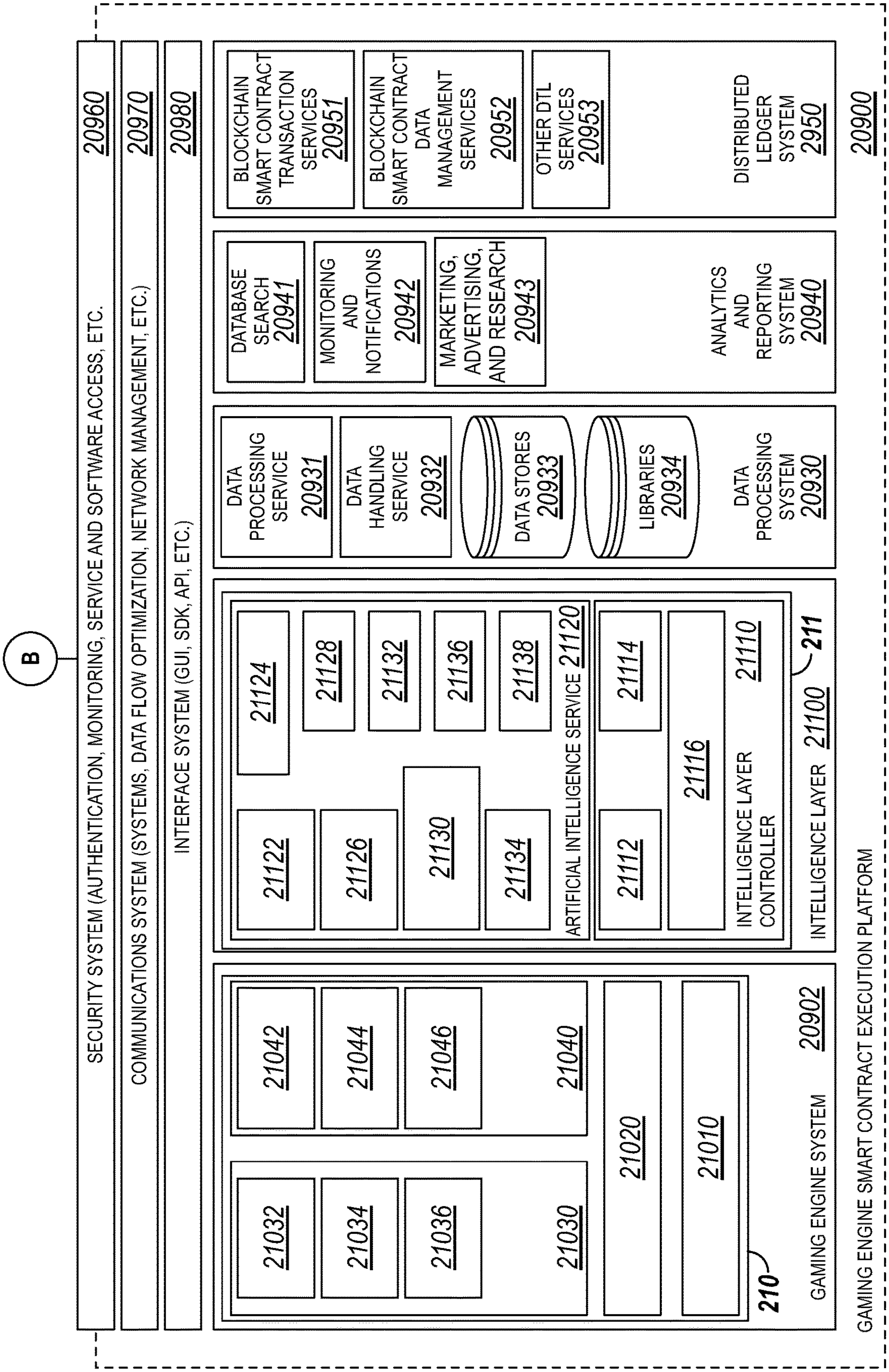
FIG. 209-C

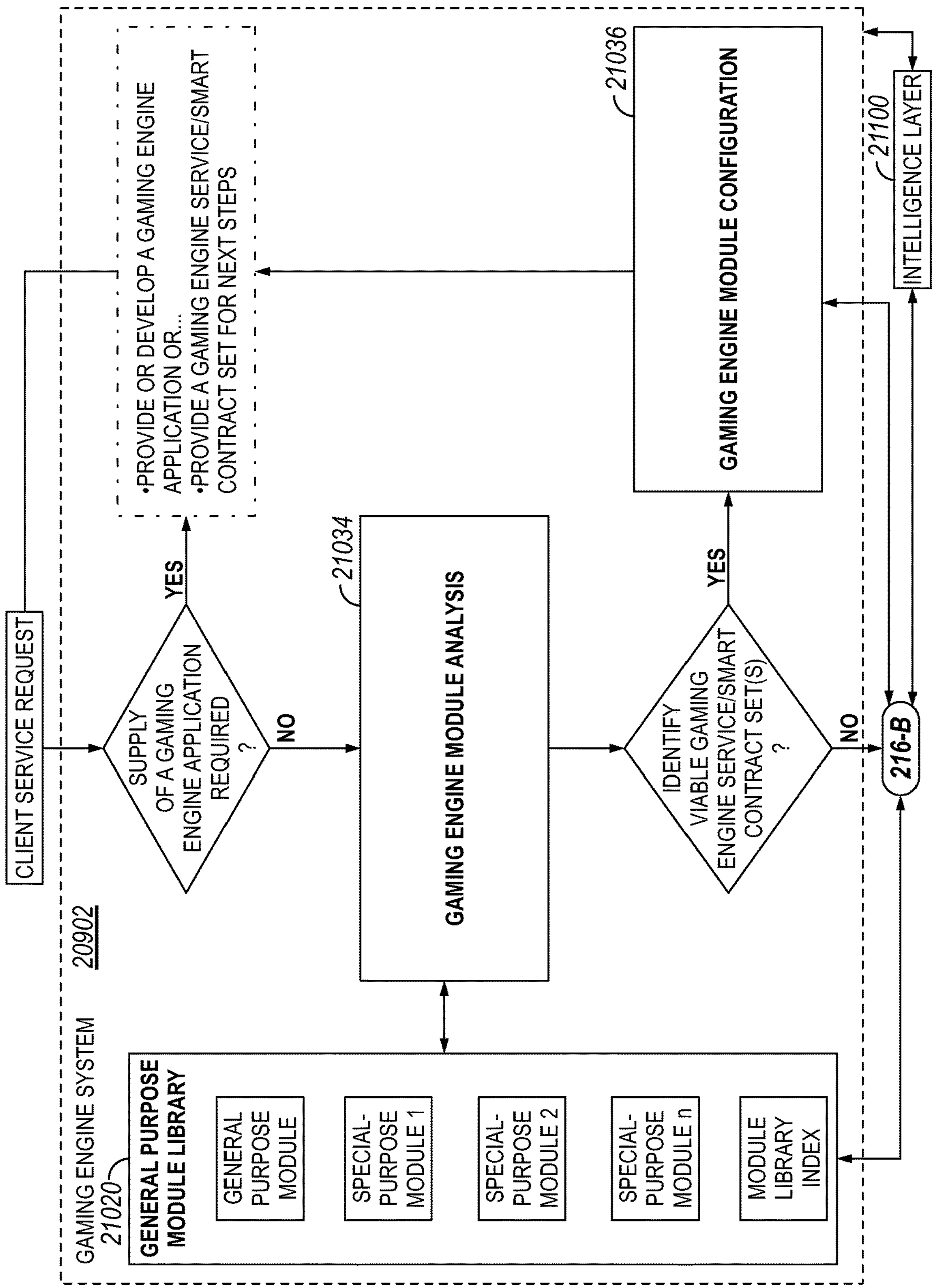
FIG. 216-A

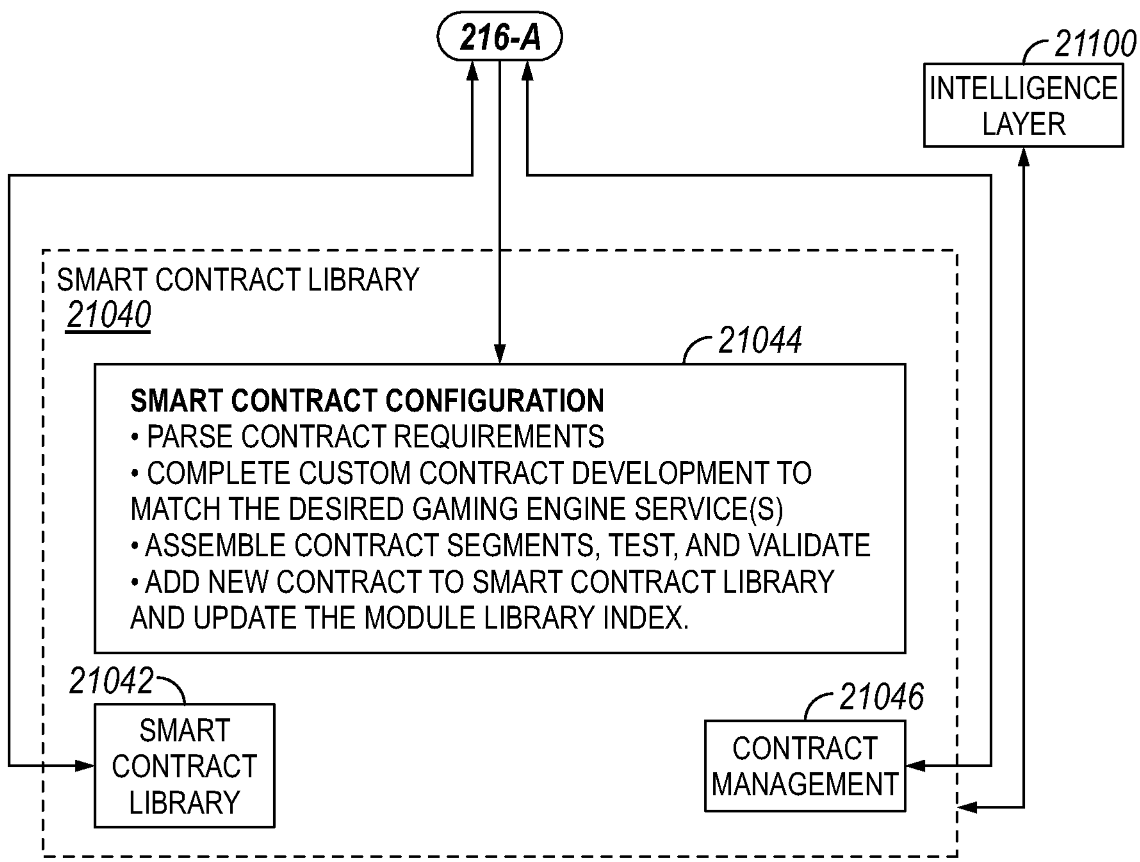
FIG. 216-B

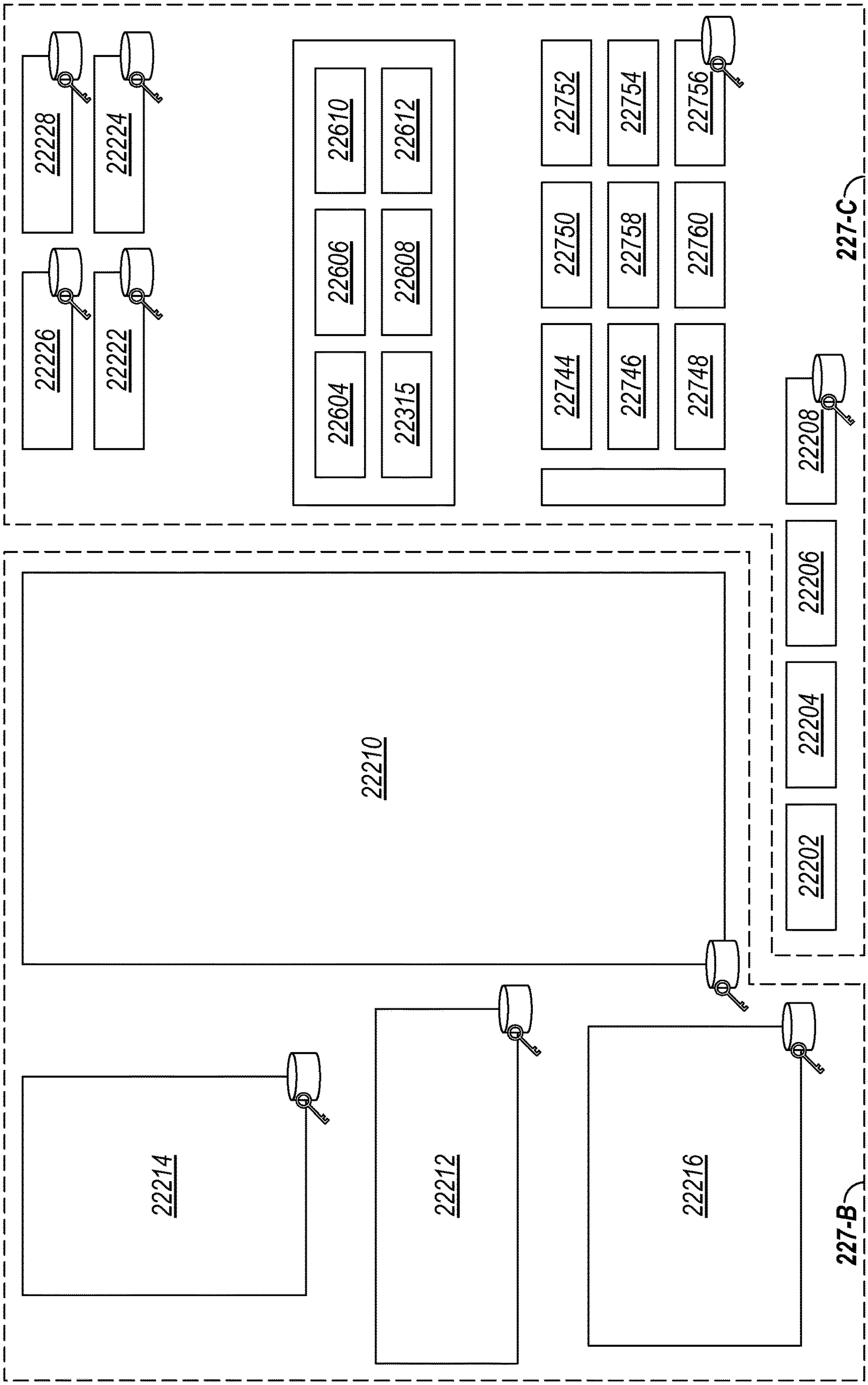
FIG. 227-A

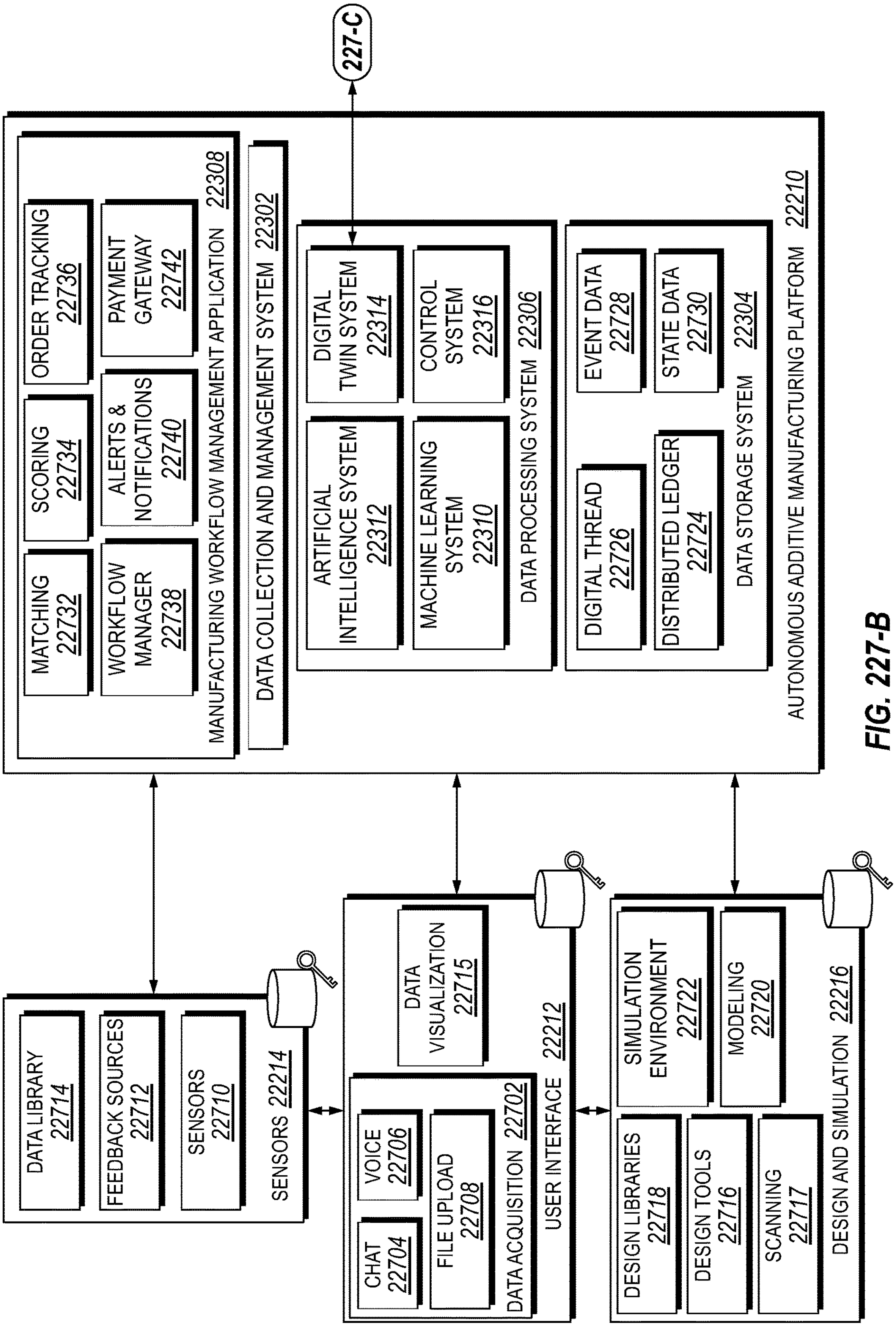
FIG. 227-B

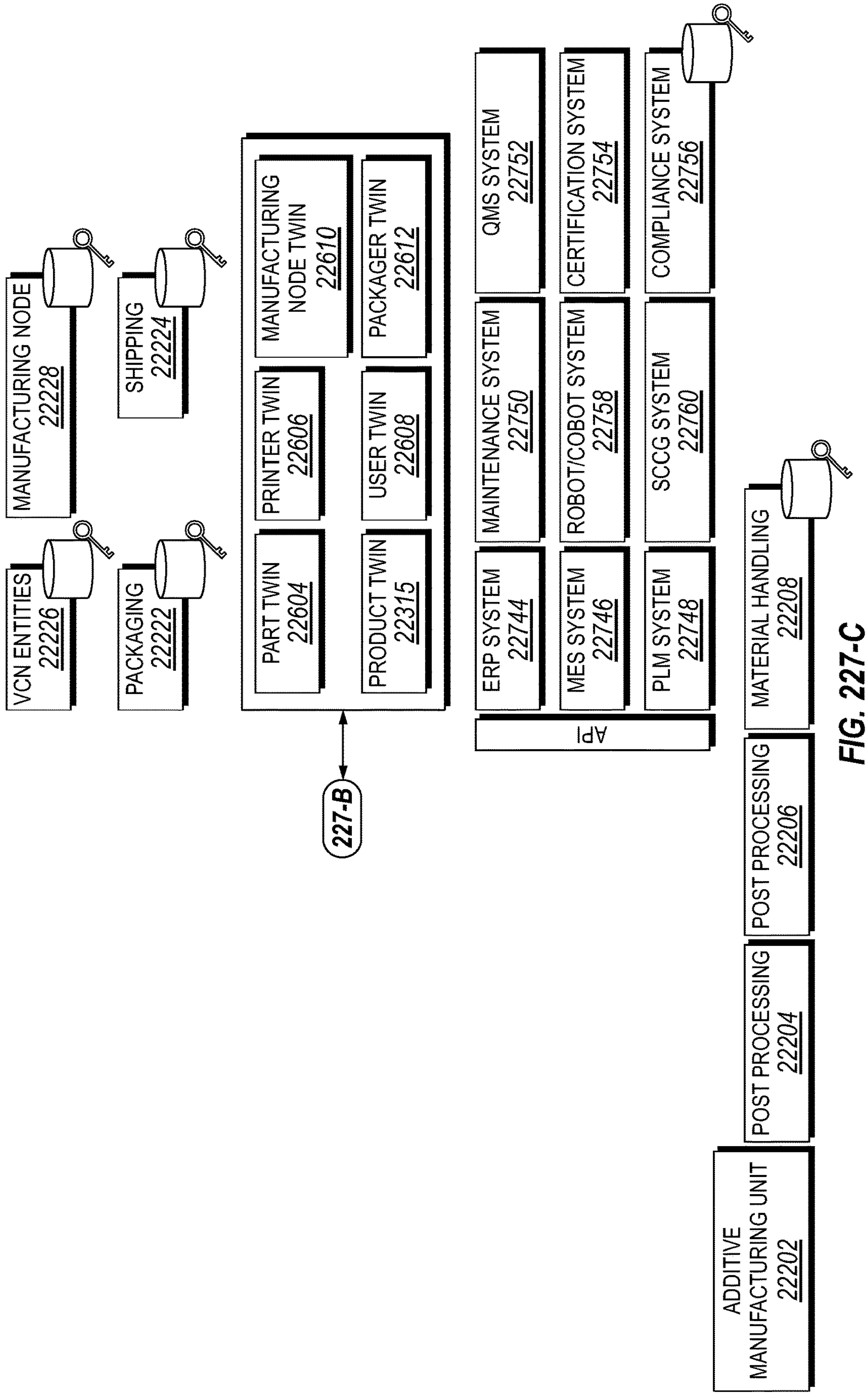
FIG. 227-C

IDL AS A DATA STRATEGIC APPROACH FOR AN ENTERPRISE

IDL VALUE ADD- MAPPING PARAMETERS OF A DATA PRODUCER WITH A DATA CONSUMER

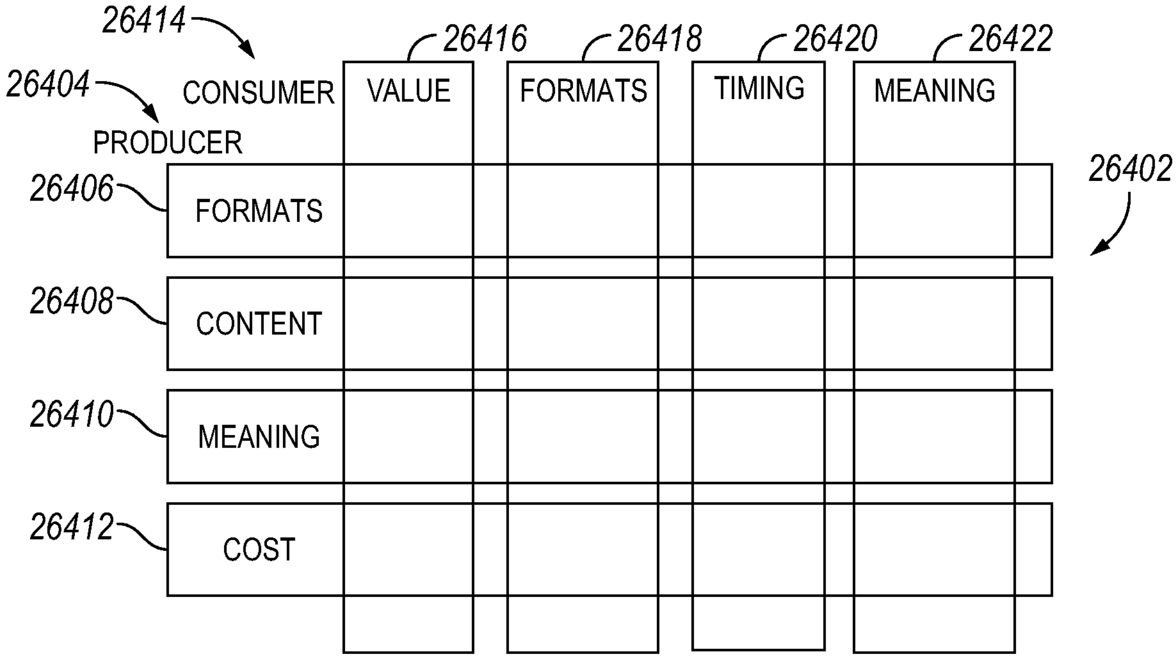

EX: P-M WITH C-V
IDL ENABLES PUTTING A VALUE TO A CONSUMER
OF A MEANING OF A SOURCE OF DATA

EX: P-C WITH C-M
IDL ENABLES ASCRIBING A MEANING TO A CONSUMER
FOR A COST OF COLLECTION BY A PRODUCER

EX: P-C WITH C-V
IDL ENABLES DETERMINING A RELATIONSHIP BETWEEN
CONSUMER PERCEIVED VALUE TO PRODUCER COSTS

EX: P-C WITH C-T
IDL ENABLES DETERMINING WHEN PRODUCER
CONTENT IS REQUIRED BY A CONSUMER

*FIG. 263*

| STACKED UTOKEN | 0 | 100k | 1M | 10M | 100M |
|---|---|---|---|---|---|
| COST PER SCORE | x | .95x | .9x | .85x | .8x |

| NODE SERVICES | LEVEL 1 NODE | LEVEL 2 NODE | LEVEL 3 NODE |
|---|---|---|---|
| DELIVER TRUST SCORES | YES | NO | NO |
| ADD EVIDENCE OF FRAUD | YES | NO | NO |
| DELIVER FRAUD ALERTS | YES | YES | NO |
| MANAGE TRUST SCORE UPDATES AND CONSENSUS | YES | YES | NO |
| CALCULATE TRUST SCORES | YES | YES | NO |
| ADD EVIDENCE OF CUSTODY | YES | YES | NO |
| VALIDATE AND STORE EVIDENCE OF FRAUD | YES | YES | YES |
| VALIDATE AND STORE EVIDENCE OF CUSTODY | YES | YES | YES |

*FIG. 309*

| NODES | 100 | 200 | 300 | 400 | 500 | 600 | 700 | 800 | 900 | 1000 |
|---|---|---|---|---|---|---|---|---|---|---|
| CLIQUES | 100 | 200 | 300 | 400 | 500 | 600 | 700 | 800 | 900 | 1000 |
| OVERLAP | 5 | 7.5 | 10 | 12.5 | 15 | 17.5 | 20 | 22.5 | 25 | 27.5 |
| P(ADDRESS A) | 0.05% | .038% | .033% | .031% | .030% | .029% | .029% | .028% | .028% | .028% |

*FIG. 310*

| UTOKEN STAKING AMOUNTS FOR LEVEL 1 NODES | MINIMUM NODES[3] | MAXIMUM NODES[4] | MINIMUM NODES[3] | MAXIMUM NODES[4] |
|---|---|---|---|---|
| | 35% OF INITIAL UTOKEN | | 50% OF INITIAL UTOKEN | |
| 3,5000,000 | 100.00 | 100.00 | 142.86 | 314.29 |
| 700,000 | 500.00 | 2,100.00 | 714.29 | 3,171.43 |
| 350,000 | 1,000.00 | 4,600.00 | 1,428.57 | 6,742.86 |
| 175,000 | 2,000.00 | 9,600.00 | 2,857.14 | 13,885.71 |
| 116,667 | 3,000.00 | 14,600.00 | 4,285.71 | 21,028.57 |
| 87,500 | 4,000.00 | 19,600.00 | 5,714.29 | 28,171.43 |
| 70,000 | 5,000.00 | 24,600.00 | 7,142.86 | 35,314.29 |

3 - MINIMUM NODES IS WHEN ALL NODES ARE LEVEL 1

4 - MAXIMUM NODES IS WHEN ALL 100 NODES ARE LEVEL1 AND THE REST ARE LEVEL 3

TRUST SCORES AND SECURITY IN TRUSTLESS INTERACTIONS BASED ON DIGITAL LEDGER ADDRESSES

CROSS-REFERENCE TO RELATED APPLICATIONS

This application is a bypass continuation of International Application No. PCT/US2022/050937, filed Nov. 23, 2022, which claims priority to: U.S. Provisional Patent Application No. 63/282,502, filed, Nov. 23, 2021; U.S. Provisional Patent Application No. 63/291,306, filed Dec. 17, 2021; U.S. Provisional Patent Application No. 63/299,703, filed Jan. 14, 2022; U.S. Provisional Patent Application No. 63/302,014, filed Jan. 21, 2022; provisional India Patent Application No. 202211008634, filed Feb. 18, 2022; U.S. Provisional Patent Application No. 63/392,083, filed Jul. 25, 2022; and U.S. Provisional Patent Application No. 63/381,546, filed Oct. 28, 2022. Each patent application referenced above is hereby incorporated by reference as if fully set forth herein in its entirety.

FIELD

The present disclosure relates to transaction platforms, and more particularly relates to transaction platforms that include systems that include sets of other systems interoperating within the transaction platforms to define the larger systems.

BACKGROUND

Intelligent Data Layers Background

Brought about by exponentially increasing connectivity and intelligence of devices of all types, the world is experiencing orders-of-magnitude increases in scale and granularity of data, as well as the emergence of entirely new types of data, all available to enable or enhance digital transactions in markets of all types. This expansion brings new challenges to parse, analyze, and derive intelligence from the fractally expanding data layers, as well as regulatory and business requirements to understand and act upon the transactions, transactors, and all corporate, individual, or AI intermediaries that operate on or interact with data.

SUMMARY

Market Orchestration

Configuring and Launching a Marketplace

In embodiments, a method for configuring and launching a marketplace includes: identifying, by a processing system having one or more processors, an opportunity to facilitate configuration of a new marketplace; receiving, by a processing system, marketplace opportunity data, where the marketplace opportunity data includes information related to a set of assets of one or more types; determining, by the processing system, configuration parameters to be implemented in the new marketplace; determining, by the processing system, the feasibility of implementing the configuration parameters in the new marketplace; determining, by the processing system, data resources to support the new marketplace; determining, by the processing system, an architecture of the new marketplace; determining, by the processing system, the configuration of the data resources in a data model for the marketplace; configuring, by the processing system, a marketplace object; connecting, by the processing system, selected data resources to populate the marketplace object; and launching, by the processing system, the new marketplace.

RPA for Configuring and Launching a New Marketplace

In embodiments, a method for configuring and launching a marketplace includes: taking an identified type of asset and defining an exchangeable marketplace object that represents a set of rights to control the type of asset, where defining the marketplace object includes specifying a data model for the marketplace object and a set of data resources for populating instances of the marketplace object; configuring the mechanism for exchange of instances of the marketplace object, where the mechanism for exchange includes a set of interfaces whereby instances of the objects may be exchanged in defined quantities for defined units of value; and configuring a set of computational and connectivity resources to support a marketplace by which the defined marketplace objects are exchanged; where at least one defining the marketplace object, configuring the mechanism of exchange and configuring the set of computational and connectivity resources is performed by robotic process automation that is trained on a training set of interactions by a set of human users.

Updating Properties of Market Orchestration Digital Twins

In embodiments, a method for updating one or more properties of one or more market orchestration digital twins includes: receiving a request to update one or more properties of one or more digital twins; retrieving the one or more digital twins required to fulfill the request; selecting data sources from a set of available data sources; retrieving data from selected data sources; and updating one or more properties of the one or more digital twins based on the retrieved data. In embodiments, the digital twins are selected from the set of marketplace digital twins, asset digital twins, trader digital twins, broker digital twins, environment digital twins, and marketplace host digital twins. In embodiments, the one or more properties of the one or more digital twins relates to asset ownership. In embodiments, the data source is selected from the set of an Internet of Things connected device, a machine vision system, an analog vibration sensor, a digital vibration sensor, a fixed digital vibration sensor, a tri-axial vibration sensor, a single axis vibration sensor, an optical vibration sensor, and a crosspoint switch.

Method of Generating a Fairness Score

In embodiments, a method for generating a fairness score for a transaction includes: receiving, by a fairness engine, transaction data from a set of transactions from an execution engine; and calculating, by the fairness engine, a fairness score representing the fairness of a transaction. In embodiments, the fairness engine includes an execution timing fairness engine that determines or receives a set of measures of latency for a set of users. In embodiments, the execution timing fairness engine automatically orchestrates a set of configuration parameters or other features that mitigate unfairness that may be caused by disparate latency. In embodiments, the set of measures of latency are determined by testing network return times. In embodiments, testing network return times includes determining the ping, the upload speed, or the download speed. In embodiments, the set of transactions are executed based upon the fairness score exceeding a predetermined threshold.

Enterprise Access Layer Summary

Enterprise Data Set Exchange

In embodiments, a computer-implemented method includes: receiving, at an access layer controlled by an enterprise, a data set characterizing one or more attributes associated with a group of assets or resources controlled by the enterprise, where the access layer corresponds to an intelligence system that hosts exchangeable enterprise assets; determining, by a permissions system of the access layer, whether the data set satisfies a set of permission criteria indicating a set of governing rules for assets or resources controlled by the enterprise; in response to the data set satisfying the permission criteria, generating, by a data services system associated with the access layer, an encoded data set that satisfies the set of governing rules; and converting the encoded data set to an exchangeable digital asset by: publishing a representation of the encoded data set to a digital wallet system of the access layer; and configuring an interface system of the access layer with access to the encoded data set represented in the digital wallet system, where the interface system is accessible by a third party. Some embodiments further include assigning a monetary value to the encoded data set that is viewable via the interface system. In embodiments, assigning the monetary value to the encoded data set includes generating an estimated monetary value from valuation data compiled from a set of target consumers. In embodiments, assigning the monetary value to the encoded data set includes: generating an invite to a set of target consumers for the data set; requesting the set of target consumers assign a proposed value to a set of secondary data sets that share one or more characteristics with the data set; and determining the monetary value for the encoded data set by statistical inference from the proposed values returned from the set of target consumers. Some embodiments further include adjusting the monetary value based on feedback from the enterprise. In embodiments, adjusting the monetary value includes: generating a feedback request to the enterprise to authorize the monetary value assigned to the encoded data set; and in response to the feedback request, receiving a message from the enterprise to modify the monetary value of the encoded data set. In some embodiments generating the encoded data set includes partially encoding a portion of the data set that includes information failing to satisfy the set of governing rules. In embodiments, publishing the representation of the encoded data set to the digital wallet system includes publishing the representation of the encoded data set to a hot wallet of the wallet system. In embodiments, publishing the representation of the encoded data set to the digital wallet system includes publishing the representation of the encoded data set to a cold wallet of the wallet system. In embodiments, publishing the encoded data set to the digital wallet system includes publishing the encoded data set to a custodial wallet of the wallet system. In embodiments, the group of resources is enterprise-owned devices. In embodiments, the group of resources is production equipment of the enterprise. In embodiments, the data set includes logistics information. In embodiments, the data set includes inventory information. In embodiments, the data set includes procurement information. In embodiments, the data set includes enterprise marketing information. In embodiments, the data set includes client-purchasing information. In embodiments, the access layer is a network access layer. In embodiments, the enterprise assets are digital assets. In embodiments, the governing rules are privacy rules. In embodiments, re the governing rules are prioritization rules.

In embodiments, a system includes: an access layer including a processor and storage hardware in communication with the processor, where the storage hardware includes instructions that when executed by the processor perform operations, and where the operations include: receiving, at the access layer controlled by an enterprise, a data set characterizing one or more attributes associated with a group of assets or resources controlled by the enterprise, where the access layer corresponds to an intelligence system that hosts exchangeable enterprise assets; determining, by a permissions system of the access layer, whether the data set satisfies a set of permission criteria indicating a set of governing rules for resources controlled by the enterprise; in response to the data set satisfying the permission criteria, generating, by a data services system associated with the access layer, an encoded data set that satisfies the set of governing rules; and converting the encoded data set to an exchangeable digital asset by: publishing a representation of the encoded data set to a digital wallet system of the access layer; and configuring an interface system of the access layer with access to the encoded data set represented in the digital wallet system, where the interface system is accessible by a third party. In embodiments, the operations further comprise assigning a monetary value to the encoded data set that is viewable via the interface system. In embodiments, assigning the monetary value to the encoded data set includes generating an estimated monetary value from valuation data compiled from a set of target consumers. In embodiments, assigning the monetary value to the encoded data set includes: generating an invite to a set of target consumers for the data set; requesting the set of target consumers assign a proposed value to a set of secondary data sets that share one or more characteristics with the data set; and determining the monetary value for the encoded data set by statistical inference from the proposed values returned from the set of target consumers. In embodiments, the operations further comprise adjusting the monetary value based on feedback from the enterprise. In embodiments, adjusting the monetary value includes: generating a feedback request to the enterprise to authorize the monetary value assigned to the encoded data set; and in response to the feedback request, receiving a message from the enterprise to modify the monetary value of the encoded data set. In embodiments, generating the encoded data set includes partially encoding a portion of the data set that includes information failing to satisfy the set of governing rules. In embodiments, publishing the encoded data set to the digital wallet system includes publishing the encoded data set to a hot wallet of the wallet system. In embodiments, publishing the encoded data set to the digital wallet system includes publishing the encoded data set to a cold wallet of the wallet system. In embodiments, publishing the encoded data set to the digital wallet system includes publishing the encoded data set to a custodial wallet of the wallet system. In embodiments, the group of resources is enterprise-owned devices. In embodiments, the group of resources is production equipment of the enterprise. In embodiments, the data set includes logistics information. In embodiments, the data set includes inventory information. In embodiments, the data set includes procurement information. In embodiments, the data set includes enterprise marketing information. In embodiments, the data set includes client-purchasing information. In embodiments, the access layer is a network access layer. In embodiments, the enterprise assets are digital assets. In embodiments, the governing rules are privacy rules. In embodiments, the governing rules are prioritization rules.

Control Plane and Data Plane Coverage

In embodiments, a computer-implemented method includes: receiving, at a network access layer, an asset request from a requesting entity, where the asset request indicates an asset available in a digital wallet system associated with the network access layer, and where the network access layer includes a data plane configured to exchange assets privately-generated by an enterprise entity operating a control plane associated with the network access layer;

identifying an asset control associated with the asset indicated by the asset request, where the asset control is configured by a permissions system of the network access layer and indicates a control parameter determined by an intelligence system of the network access layer, and where the control parameter is configured using data derived from the enterprise entity that privately generated the asset; determining whether the asset control is satisfied by at least one of the asset request or the requesting entity; and in response to the asset control being satisfied, facilitating fulfillment of the asset request. In embodiments, the asset is available in a hot wallet of the digital wallet system. In embodiments, the asset is available in a cold wallet of the digital wallet system. In embodiments, the asset is available in a custodial wallet of the digital wallet system. In embodiments, facilitating fulfillment of the asset request includes transferring a set of keys for the cold wallet to a hot wallet of the digital wallet system. In embodiments, facilitating fulfillment of the asset request includes: signing a transaction involving the asset on the cold wallet; and relaying the signed transaction using a hot wallet of the digital wallet system that is associated with the cold wallet. In embodiments, facilitating fulfillment of the asset request includes connecting the cold wallet to the requesting entity. In embodiments, the asset control matches an access control for an enterprise entity that submitted the asset to the digital wallet system. In embodiments, the asset control indicates a security clearance level. In embodiments, the asset control includes transactional detail requirements for the asset.

In embodiments, a system includes: a network access layer including a processor and storage hardware in communication with the processor, where the storage hardware includes instructions that when executed by the processor perform operations, and where the operations include: receiving, at the network access layer, an asset request from a requesting entity, where the asset request indicates an asset available in a digital wallet system associated with the network access layer, and where the network access layer includes a data plane configured to exchange assets privately-generated by an enterprise entity operating a control plane associated with the network access layer; identifying an asset control associated with the asset indicated by the asset request, where the asset control is configured by a permissions system of the network access layer and indicates a control parameter determined by an intelligence system of the network access layer, and where the control parameter is configured using data derived from the enterprise entity that privately generated the asset; determining whether the asset control is satisfied by at least one of the asset request or the requesting entity; and in response to the asset control being satisfied, facilitating fulfillment of the asset request. In embodiments, the asset is available in a hot wallet of the digital wallet system. In embodiments, the asset is available in a cold wallet of the digital wallet system. In embodiments, the asset is available in a custodial wallet of the digital wallet system. In embodiments, facilitating fulfillment of the asset request includes transferring a set of keys for the cold wallet to a hot wallet of the digital wallet system. In embodiments, facilitating fulfillment of the asset request includes: signing a transaction involving the asset on the cold wallet; and relaying the signed transaction using a hot wallet of the digital wallet system that is associated with the cold wallet. In embodiments, facilitating fulfillment of the asset request includes connecting the cold wallet to the requesting entity. In embodiments, the asset control matches an access control for an enterprise entity that submitted the asset to the digital wallet system. In embodiments, the asset control indicates a security clearance level. In embodiments, the asset control includes transactional detail requirements for the asset.

Private to Public Block Chain Via an Enterprise Access Layer

In embodiments, a computer-implemented method includes: receiving, at a network access layer, an asset request from a requesting entity, where the asset request indicates an asset available in a digital wallet system associated with the network access layer, where the network access layer corresponds to a client-facing intelligence system that hosts exchangeable digital assets, and where the exchangeable digital assets correspond to one or more assets stored in a private append-only data structure associated with an owner of the exchangeable digital assets; identifying an asset control associated with the asset indicated by the asset request, where the asset control is configured by a permissions system of the network access layer and indicates a control parameter determined by an intelligence system of the network access layer; determining whether the asset control is satisfied by at least one of the asset request or the requesting entity; and in response to the asset control being satisfied by the at least one of the asset request or the requesting entity, facilitating fulfillment of the asset request, where fulfillment includes storing the asset in a public append-only data structure to represent an exchange of the asset with the requesting entity. In embodiments, the asset is available in a hot wallet of the digital wallet system. In embodiments, the asset is available in a cold wallet of the digital wallet system. In embodiments, the asset is available in a custodial wallet of the digital wallet system. In embodiments, facilitating fulfillment of the asset request includes transferring a set of keys for the cold wallet to a hot wallet of the digital wallet system. In embodiments, facilitating fulfillment of the asset request includes: signing a transaction involving the asset on the cold wallet; and relaying the signed transaction using a hot wallet of the digital wallet system that is associated with the cold wallet. In embodiments, facilitating fulfillment of the asset request includes connecting the cold wallet to the requesting entity. In embodiments, the asset control matches an access control for an enterprise entity that submitted the asset to the digital wallet system. In embodiments, the asset control indicates a security clearance level. In embodiments, the asset control includes transactional detail requirements for the asset.

In embodiments, a system includes: a network access layer including a processor and storage hardware in communication with the processor, where the storage hardware includes instructions that when executed by the processor perform operations, and where the operations include: receiving, at a network access layer, an asset request from a requesting entity, where the asset request indicates an asset available in a digital wallet system associated with the network access layer, where the network access layer corresponds to a client-facing intelligence system that hosts exchangeable digital assets, and where the exchangeable digital assets correspond to one or more assets stored in a private append-only data structure associated with an owner of the exchangeable digital assets; identifying an asset control associated with the asset indicated by the asset request, where the asset control is configured by a permissions system of the network access layer and indicates a control parameter determined by an intelligence system of the network access layer; determining whether the asset control is satisfied by at least one of the asset request or the requesting entity; and in response to the asset control being satisfied by the at least one of the asset request or the requesting entity, facilitating fulfillment of the asset request, where fulfillment includes storing the asset in a public append-only data structure to represent an exchange of the asset with the requesting entity. In embodiments, the asset is available in a hot wallet of the digital wallet system. In embodiments, the asset is available in a cold wallet of the digital wallet system. In embodiments, the asset is available in a custodial wallet of the digital wallet system. In embodiments, facilitating fulfillment of the asset request includes transferring a set of keys for the cold wallet to a hot wallet of the digital wallet system. In embodiments, facilitating fulfillment of the asset request includes: signing a transaction involving the asset on the cold wallet; and relaying the signed transaction using a hot wallet of the digital wallet system that is associated with the cold wallet. In embodiments, facilitating fulfillment of the asset request includes connecting the cold wallet to the requesting entity. In embodiments, the asset control matches an access control for an enterprise entity that submitted the asset to the digital wallet system. In embodiments, the asset control indicates a security clearance level. In embodiments, the asset control includes transactional detail requirements for the asset.

Assigning Access Controls to an Enterprise-Generated Asset

In embodiments, a computer-implemented method includes: receiving, at a network access layer controlled by an enterprise, a set of assets privately generated by the enterprise, where the network access layer corresponds to a client-facing intelligence system that hosts exchangeable enterprise digital assets; for each asset of the set of assets: classifying, by an artificial-intelligence system of the network access layer, the respective asset into an access control category, where each asset control category is associated with a set of asset controls that dictate one or more transaction parameters for the exchange of the respective asset with a third party; and assigning, by a permissions system of the network access layer, the set of asset controls for the access control category classified by the AI system for the respective asset; and converting the set of assets to exchangeable digital assets by: publishing the set of assets to a digital wallet system of the network access layer; and configuring an interface system of the network access layer with access to the set in the digital wallet system, where the interface system is accessible by a third party. In embodiments, publishing the set of assets to the digital wallet system includes publishing at least a portion of assets in the set to a hot wallet of the digital wallet system. In embodiments, publishing the set of assets to the digital wallet system includes publishing at least a portion of assets in the set to a cold wallet of the digital wallet system. In embodiments, publishing the set of assets to the digital wallet system includes publishing at least a portion of assets in the set to a custodial wallet of the digital wallet system. In embodiments, publishing the set of assets to the digital wallet system includes publishing a first portion of assets in the set to a hot wallet of the digital wallet system and a second portion of the assets in the set to a cold wallet of the digital wallet system. In embodiments, the first portion has a first access control category that indicates that a first set of asset controls of the first access control category is less restrictive than a second set of asset controls for a second access control category classified for the second portion. In embodiments, the first portion has a first access control category that indicates a greater frequency of access than a second access control category classified for the second portion. In embodiments, the set of asset controls includes an asset control that matches an access control for an enterprise entity that communicated at least one of the assets from the set of assets to the network asset layer. In embodiments, the set of asset controls includes an asset control that indicates a security clearance level. In embodiments, the one or more transaction parameters include a minimum pricing requirement. In embodiments, a system including: a network access layer including a processor and storage hardware in communication with the processor, where the storage hardware includes instructions that when executed by the processor perform operations, and where the operations include: receiving, at a network access layer controlled by an enterprise, a set of assets privately generated by the enterprise, where the network access layer corresponds to a client-facing intelligence system that hosts exchangeable enterprise digital assets; for each asset of the set of assets: classifying, by an artificial-intelligence system of the network access layer, the respective asset into an access control category, where each asset control category is associated with a set of asset controls that dictate one or more transaction parameters for the exchange of the respective asset with a third party; and assigning, by a permissions system of the network access layer, the set of asset controls for the access control category classified by the AI system for the respective asset; and converting the set of assets to exchangeable digital assets by: publishing the set of assets to a digital wallet system of the network access layer; and configuring an interface system of the network access layer with access to the set in the digital wallet system, where the interface system is accessible by a third party. In embodiments, publishing the set of assets to the digital wallet system includes publishing at least a portion of assets in the set to a hot wallet of the digital wallet system. In embodiments, publishing the set of assets to the digital wallet system includes publishing at least a portion of assets in the set to a cold wallet of the digital wallet system. In embodiments, publishing the set of assets to the digital wallet system includes publishing at least a portion of assets in the set to a custodial wallet of the digital wallet system. In embodiments, publishing the set of assets to the digital wallet system includes publishing a first portion of assets in the set to a hot wallet of the digital wallet system and a second portion of the assets in the set to a cold wallet of the digital wallet system. In embodiments, the first portion has a first access control category that indicates that a first set of asset controls of the first access control category is less restrictive than a second set of asset controls for a second access control category classified for the second portion. In embodiments, the first portion has a first access control category that indicates a greater frequency of access than a second access control category classified for the second portion. In embodiments, the set of asset controls includes an asset control that matches an access control for an enterprise entity that communicated at least one of the assets from the set of assets to the network asset layer. In embodiments, the set of asset controls includes an asset control that indicates a security clearance level. In embodiments, the one or more transaction parameters include a minimum pricing requirement.

Monitoring Public Data Exchanges for Viable Enterprise Data Transactions

In embodiments, a computer-implemented method includes: monitoring a plurality of public market participants via an interface system of a network access layer, where the network access layer is controlled by an enterprise and corresponds to an intelligence system that hosts exchangeable enterprise digital assets; receiving, at the network access layer via the interface system, an indication that a monitored public market participant requests a digital asset candidate; determining, by the intelligence system of the network access layer, whether the digital asset candidate matches an asset available in a digital wallet system associated with the network access layer; and in response to the digital asset candidate matching the asset available in the digital wallet system: identifying a set of asset controls managed by a permission system of the network asset layer, where the permission system is configured to assign the set of asset controls to exchangeable enterprise digital assets in the digital wallet system; determining whether a transaction with the monitored public market participant that involves the asset available in the digital wallet system satisfies an asset control criteria corresponding to the asset available, where the asset control criteria indicates that a threshold number of the set of asset controls have been violated; and in response to determining that the transaction with the monitored public market participant that involves the asset available in the digital wallet system satisfies the asset control criteria, generating a message data packet requesting an actual transaction with the monitored public market participant involving the asset available, where the message data packet is configured for communication via the interface system. In embodiments, the asset is available in a hot wallet of the digital wallet system. In embodiments, the asset is available in a cold wallet of the digital wallet system. In embodiments, the asset is available in a custodial wallet of the digital wallet system. Some embodiments include: receiving a response message from the monitored public market participant; and determining that the response message indicates an acknowledgement to fulfill the request for the actual transaction; and facilitating fulfillment of the actual transaction. In embodiments, facilitating fulfillment of the actual transaction includes storing a digital form of the asset in a public append-only data structure to represent execution of the actual transaction. In embodiments, facilitating fulfillment of the asset request includes: signing the actual transaction involving the asset on a cold wallet; and relaying the signed transaction using a hot wallet of the digital wallet system that is associated with the cold wallet. In embodiments, storing the digital form of the asset to a public append-only data structure facilitating uses at least one key from a hot wallet of the digital wallet system. In embodiments, storing the digital form of the asset to a public append-only data structure facilitating uses at least one key from a cold wallet of the digital wallet system. In embodiments, the set of asset controls includes an asset control that matches an access control for an enterprise entity that submitted the asset to the digital wallet system. In embodiments, the set of asset controls includes an asset control that indicates a security clearance level for the asset. In embodiments, the set of asset controls transactional detail requirements for the asset.

In embodiments, a system includes: a network access layer including a processor and storage hardware in communication with the processor, where the storage hardware includes instructions that when executed by the processor perform operations, and where the operations include: monitoring a plurality of public market participants via an interface system of a network access layer, where the network access layer is controlled by an enterprise and corresponds to an intelligence system that hosts exchangeable enterprise digital assets; receiving, at the network access layer via the interface system, an indication that a monitored public market participant requests a digital asset candidate; determining, by the intelligence system of the network access layer, whether the digital asset candidate matches an asset available in a digital wallet system associated with the network access layer; and in response to the digital asset candidate matching the asset available in the digital wallet system: identifying a set of asset controls managed by a permission system of the network asset layer, where the permission system is configured to assign the set of asset controls to exchangeable enterprise digital assets in the digital wallet system; determining whether a transaction with the monitored public market participant that involves the asset available in the digital wallet system satisfies an asset control criteria corresponding to the asset available, where the asset control criteria indicates that a threshold number of the set of asset controls have been violated; and in response to determining that the transaction with the monitored public market participant that involves the asset available in the digital wallet system satisfies the asset control criteria, generating a message data packet requesting an actual transaction with the monitored public market participant involving the asset available, where the message data packet is configured for communication via the interface system. In embodiments, the asset is available in a hot wallet of the digital wallet system. In embodiments, the asset is available in a cold wallet of the digital wallet system. In embodiments, the asset is available in a custodial wallet of the digital wallet system. In embodiments, the operations further comprise: receiving a response message from the monitored public market participant; and determining that the response message indicates an acknowledgement to fulfill the request for the actual transaction; and facilitating fulfillment of the actual transaction. In embodiments, facilitating fulfillment of the actual transaction includes storing a digital form of the asset in a public append-only data structure to represent execution of the actual transaction. In embodiments, facilitating fulfillment of the asset request includes: signing the actual transaction involving the asset on a cold wallet; and relaying the signed transaction using a hot wallet of the digital wallet system that is associated with the cold wallet. In embodiments, storing the digital form of the asset to a public append-only data structure facilitating uses at least one key from a hot wallet of the digital wallet system. In embodiments, storing the digital form of the asset to a public append-only data structure facilitating uses at least one key from a cold wallet of the digital wallet system. In embodiments, the set of asset controls includes an asset control that matches an access control for an enterprise entity that submitted the asset to the digital wallet system. In embodiments, the set of asset controls includes an asset control that indicates a security clearance level for the asset. In embodiments, the set of asset controls transactional detail requirements for the asset.

Managing Tenancy in a Multi-Party Enterprise Access Layer

In embodiments, a computer-implemented method includes: monitoring, using an access layer accessible to a plurality of tenant enterprises, a set of assets associated with a set of digital wallets of a digital wallet system for the access layer, where the access layer corresponds to a tenant-facing intelligence system that hosts exchangeable enterprise assets; receiving, at the access layer, an indication that a requesting tenant enterprise of the plurality of tenant enterprises requests a transaction involving an asset of the set of assets; determining, by the access layer, whether the requesting tenant enterprise has a set of access rights that satisfy an access criteria for the asset of the requested transaction; in response to the requesting tenant having the set of access rights that satisfy the access criteria, deploying, for the requesting tenant enterprise, a set of resources associated with the access layer and shared among the plurality of tenant enterprises to facilitate the transaction involving the asset on behalf of the tenant enterprise.

In embodiments, the requesting tenant enterprise includes a first tenant enterprise and a second tenant enterprise; the method further includes determining a transaction priority for each of the first tenant enterprise and the second tenant enterprise; and deploying the set of resources occurs for the first tenant enterprise having a first transaction priority greater than a second transaction priority of the second tenant enterprise. In embodiments, each tenant enterprise is associated with (i) a set of private resources inaccessible to each other tenant and (ii) a set of shared resources associated with the access layer and shared among the plurality of tenant enterprises. In embodiments, the digital wallet system includes: a first subset of digital wallets accessible to one of the tenant enterprises and inaccessible to other tenant enterprises; and a second subset of digital wallets accessible to and shared among a set of the plurality of tenant enterprises. In embodiments, the access layer is a network access layer. In embodiments, the exchangeable enterprise assets are digital assets. In embodiments, the set of digital wallets includes a cold wallet. In embodiments, the set of digital wallets includes a hot wallet and a cold wallet. In embodiments, the set of digital wallets includes a custodial wallet. In embodiments, the set of digital wallets includes a custodial wallet and a cold wallet. In embodiments, the set of digital wallets includes at least two of a hot wallet, a cold wallet, or a custodial wallet.

Peer-to-Peer Enterprise Access Layer

In embodiments, a computer-implemented method includes: receiving, at an access layer, an asset request from a requesting entity, where the asset request indicates a transaction involving an asset available in a digital wallet system associated with the access layer, and where the access layer corresponds to an intelligence system that hosts exchangeable enterprise assets; identifying an asset control associated with the asset indicated by the asset request, where the asset control is configured by a permissions system of the access layer and indicates a control parameter determined by an intelligence system of the access layer; determining whether the asset control is satisfied by at least one of the asset request or the requesting entity; and in response to the asset control being satisfied, establishing a peer-to-peer access layer between the requesting entity and another transacting entity associated with the transaction indicated by the asset request, where the peer-to-peer access layer provides the other transacting entity with access to a limited set of digital assets and resources of the requesting entity. In embodiments, the transacting entity includes a plurality of entities forming a multilateral connection between the requesting entity and the plurality of entities. In embodiments, the peer-to-peer connection is a secure connection. Some embodiments further include generating, using a data processing system of the access layer, an encrypted message packet for communication using the peer-to-peer connection. In embodiments, the access layer is a network access layer. In embodiments, the exchangeable enterprise assets are digital assets. In embodiments, the asset is available in a digital wallet of the digital wallet system. In embodiments, the digital wallet is a cold wallet. In embodiments, the digital wallet is a hot wallet. In embodiments, the digital wallet is a custodial wallet. In embodiments, the peer-to-peer access layer provides an interface that is accessible by a wallet system of the other transacting party, whereby the wallet system of the other transacting party accesses the limited set of digital assets and resources of the requesting enterprise via the interface. Some embodiments further include: receiving a set of access rules from a user device associated with the requesting entity, where the set of access rules define the set of digital assets and resources that are accessible to the other transacting enterprise; and configuring the peer-to-peer access layer based on the set of access rules.

Market Orchestration Architecture

In embodiments, a system for normalizing an item value for a plurality of exchanges includes: a plurality of electronic exchanges configured for conducting transactions for at least one item in a set of items; an item value normalization system configured to identify a reference item in the set of items, and state a value for at least one other item in the set of items as a normalized value relative to a value of the reference item; and a robotic process automation system executing a set of computer-readable instructions on at least one processor, the instructions causing the robotic process automation system to automate item value normalization through automated operation of the item value normalization system. In embodiments, the item value normalization system is configured to identify the reference item based on a transaction history for one or more candidate reference items in the set of items. In embodiments, the item value normalization system is configured to identify the reference item based on a transaction history for one or more items that are similar to a candidate reference item. In embodiments, the item value normalization system is configured to identify the reference item based on a degree of commonality of a candidate reference item to other items in the set of items. In embodiments, an item identified as a reference item from the set of items for a first exchange is distinct from an item identified as a reference item from the set of items for a second exchange. In embodiments, to automate item value normalization includes stating the normalized item value based on a native currency of a target electronic exchange of the plurality exchanges. In embodiments, to state a value for at least one other item in the set of items as a normalized value includes at least one exchange-specific fee associated with conducting a transaction for the item. In embodiments, the item value normalization system is further configured to identify a reference set of items, and state a value for at least one other item in a different set of items as a normalized value relative to a value of at least one item in the set of reference items. Some embodiments further include a set of robotic process automation services that are configured to generate a token that represents an item in the second exchange based on characteristics of the item determined from data from the first exchange. Some embodiments further include a set of robotic process automation services that are configured to generate a digital representation of a set of rights relating to an item that is consistent with governing rules of the second exchange based on processing at least one of a set of smart contracts and a set of terms and conditions relating to the item. Some embodiments further include a set of robotic process automation services that are configured to orchestrate a set of transaction workflows in each of a plurality of exchanges, such that initiation of a set of actions in one exchange of the plurality of exchanges automatically results in the triggering of a set of actions in at least one other exchange. Some embodiments further include a digital twin that represents a set of entities, workflows, and transaction parameters of a plurality of exchanges, such that interaction with an interface of the digital twin can orchestrate an interaction in each of the plurality of exchanges. Some embodiments further include a data and network infrastructure pipeline that is configured to deliver data from a set of assets to set of smart contracts that include terms, conditions and parameters for a set of transaction workflows involving the assets, where the pipeline is automatically configured to adjust a network path based on the characteristics of the data and at least one performance parameter of the network path. Some embodiments further include a data and network infrastructure pipeline that is configured to deliver data from a set of assets to an interface by which an operator orchestrates a set of parameters for a set of transaction workflows involving the assets, where the pipeline is automatically configured to adjust timing of data delivery based on at least one of a transaction parameter and a network performance parameter.

Some embodiments further include a set of application programming interfaces to a marketplace that are configured to be integrated into an electronic wallet system, such that interactions with a set of interfaces of the wallet system automatically trigger a set of transaction workflows within the marketplace. Some embodiments further include a set of application programming interfaces to a marketplace that are configured to be integrated into a digital twin platform, such that interactions with a set of interfaces of the digital twin platform automatically trigger a set of transaction workflows within the marketplace. Some embodiments further include a set of application programming interfaces to a marketplace that are configured to be integrated into an enterprise database platform, such that interactions with a set of interfaces of the enterprise database platform automatically trigger a set of transaction workflows within the marketplace. Some embodiments further include a set of application programming interfaces to a marketplace that are configured to be integrated into a platform-as-a-service platform, such that interactions with a set of interfaces of the platform-as-a-service platform automatically trigger a set of transaction workflows within the marketplace. Some embodiments further include a set of application programming interfaces to a marketplace that are configured to be integrated into a computer-aided design platform, such that interactions with a set of interfaces of the computer-aided design platform automatically trigger a set of transaction workflows within the marketplace. Some embodiments further include a set of application programming interfaces to a marketplace that are configured to be integrated into a video game, such that interactions with a set of interfaces of the video game automatically trigger a set of transaction workflows within the marketplace.

In embodiments, a system for normalizing an item value for a plurality of exchanges includes: a plurality of electronic exchanges configured for conducting transactions for at least one item in a set of items in an exchange-native currency for each of the plurality of electronic exchanges; an item value normalization system configured to identify a reference currency of a plurality of exchange-native currencies for the plurality of electronic exchanges, and to state a value for the at least one item in the set of items as a normalized value relative to a reference currency value of the at least one item; and a robotic process automation system executing a set of computer-readable instructions on at least one processor, the instructions causing the robotic process automation system to automate item value normalization through automated operation of the item value normalization system. In embodiments, the item value normalization system is further configure to identify a reference currency based on a candidate currency exchange rate history, a futures value of a candidate currency, a volatility score of a candidate currency, or a relative valuation of a candidate currency. In embodiments, the item value normalization system is configured to identify the reference currency based on an exchange rate for a portion of the plurality of exchange-native currencies. In embodiments, to state a value for the at least one item in the set of items as a normalized value includes at least one exchange-specific fee associated with conducting a transaction for the item. Some embodiments further include a set of robotic process automation services that are configured to generate a token that represents an item in the second exchange based on characteristics of the item determined from data from the first exchange. Some embodiments further include a set of robotic process automation services that are configured to generate a digital representation of a set of rights relating to an item that is consistent with governing rules of the second exchange based on processing at least one of a set of smart contracts and a set of terms and conditions relating to the item.

Some embodiments further include a set of robotic process automation services that are configured to orchestrate a set of transaction workflows in each of a plurality of exchanges, such that initiation of a set of actions in one exchange of the plurality of exchanges automatically results in the triggering of a set of actions in at least one other exchange. Some embodiments further include a digital twin that represents a set of entities, workflows, and transaction parameters of a plurality of exchanges, such that interaction with an interface of the digital twin can orchestrate an interaction in each of the plurality of exchanges. Some embodiments further include a data and network infrastructure pipeline that is configured to deliver data from a set of assets to set of smart contracts that include terms, conditions and parameters for a set of transaction workflows involving the assets, where the pipeline is automatically configured to adjust a network path based on the characteristics of the data and at least one performance parameter of the network path. Some embodiments further include a data and network infrastructure pipeline that is configured to deliver data from a set of assets to an interface by which an operator orchestrates a set of parameters for a set of transaction workflows involving the assets, where the pipeline is automatically configured to adjust timing of data delivery based on at least one of a transaction parameter and a network performance parameter. Some embodiments further include a set of application programming interfaces to a marketplace that are configured to be integrated into an electronic wallet system, such that interactions with a set of interfaces of the wallet system automatically trigger a set of transaction workflows within the marketplace. Some embodiments further include a set of application programming interfaces to a marketplace that are configured to be integrated into a digital twin platform, such that interactions with a set of interfaces of the digital twin platform automatically trigger a set of transaction workflows within the marketplace.

Some embodiments further include a set of application programming interfaces to a marketplace that are configured to be integrated into an enterprise database platform, such that interactions with a set of interfaces of the enterprise database platform automatically trigger a set of transaction workflows within the marketplace. Some embodiments further include a set of application programming interfaces to a marketplace that are configured to be integrated into a platform-as-a-service platform, such that interactions with a set of interfaces of the platform-as-a-service platform automatically trigger a set of transaction workflows within the marketplace. Some embodiments further include a set of application programming interfaces to a marketplace that are configured to be integrated into a computer-aided design platform, such that interactions with a set of interfaces of the computer-aided design platform automatically trigger a set of transaction workflows within the marketplace. Some embodiments further include a set of application programming interfaces to a marketplace that are configured to be integrated into a video game, such that interactions with a set of interfaces of the video game automatically trigger a set of transaction workflows within the marketplace. In embodiments, a system for item token generation including: a smart contact for an item, the smart contract for control of at least a portion of aspects of conducting a transaction for the item in a first exchange; a set of item characteristics that facilitate tokenization of the item; a set of target exchange characteristics rules; a smart contract parsing system configured to parse the smart contract for the item into a set of contract terms for the item; a token generation system configured to receive the set of contract terms for the item, to receive the set of item characteristics, to receive the set of target exchange characteristics rules and to generate through cooperative operation of a smart contract engine, a token for the item for use in the target exchange; and a smart contract engine interfacing with the token generation system and configured to perform validation of at least one of the contract terms through emulation of a smart contract generated for the item.

In embodiments, the smart contract engine is further configured to perform validation of at least one of a set of contract terms for a smart contract configured for the target exchange. Some embodiments further include a set of characteristics harvesting functions configured to facilitate harvesting the set of item characteristics from a digital representation of the item in the first exchange. Some embodiments further include a set of robotic process automation services executing a set of computer-readable instructions on at least one processor, the instructions causing the robotic process automation system to automate item token generation through automated operation of the token generation system. In embodiments, a system for item token generation including: a first token representing characteristics of an item in a first electronic exchange; a set of target exchange characteristics rules; a set of item characteristics harvesting services configured to extract one or more item characteristics from the first token; a token generation system configured to receive the first token, to receive the set of target exchange characteristics rules and to generate a token for the item for use in the target exchange by applying at least one of the set item characteristic harvesting services to harvest a set of characteristics of an item represented by the first token; and a robotic process automation system executing a set of computer-readable instructions on at least one processor, the instructions causing the robotic process automation system to automate item token generation through automated operation of the token generation system.

Intelligent Data Layer Summary

Intelligent Data Layer System

In embodiments, an intelligent data layer system includes: a computer-readable storage system that stores a layer configuration data store that maintains: ingestion parameters including one or more data structures that represent aspects of one or more of a plurality of data sources including a source location, an interface protocol, a source data ontology, and an ingestion cost; parsing rules that facilitate determining one or more of structure, content, relationships among data elements, intended meaning of the data elements, or relationships of data, structure, and intended meaning; and one or more analysis algorithms; and a set of one or more processors that execute a set of computer-readable instructions, where the set of one or more processors collectively: receive an intelligence request from an intelligence consumer portal; determine at least one data source for deriving intelligence for the consumer portal based on the received request; configure an ingestion system based on the ingestion parameters and parsing rules in the layer configuration data store for the at least one data source; configure an analysis system based on the analysis algorithms in the layer configuration data store for the at least one data source; configure an intelligence deriving system based on information in the request and available intelligence services in an intelligence service system; and operate the system to ingest data from the at least one data source using the ingestion system, analyze the ingested data from the at least one data source using the analysis system, derive a set of intelligence data from at least one of the ingested data form the at least one data source and an outcome of using the analysis system, and communicating the set of intelligence data to at least one of the consumer portal or an intelligent data layer store. In embodiments, the computer-readable storage system stores an intelligent data layer store that maintains results of operations of one or more systems of the intelligent data layer system. In embodiments, the one or more systems includes the ingestion system, the analysis system, and the intelligence deriving system. In embodiments, the result of operations includes intermediate results of at least one of the one or more systems and at least one role-adapted final result variant of the intermediate results. In embodiments, to configure the analysis system is further based on consumer intelligence objectives of the request. In embodiments, to configure the analysis system is further based on aspects of the request.

In embodiments, the set of one or more processors is configured in an intelligent data layer control tower that configures and operates the intelligent data layer system by communicating control sequences with the ingestion system, the analysis system, and the intelligence deriving system. Some embodiments further include an algorithm portal of an intelligent data layer control tower of the system through which at least one of the analysis algorithms is received. In embodiments, the ingestion system parses content of data sources to determine structure of the content and relationships among elements in the data. In embodiments, the ingestion system parsing a content of data sources results in generating characterization data that includes an intended meaning of elements of the data and relationships among the data, structures of the data, and meaning of the data parsed from the content. In embodiments, the ingestion system assigns a relationship attribute to a pair of data values that are configured as parent/child in a hierarchy of the data source. In embodiments, the ingestion system is configured to maintain a schedule of collection activity for one or more data sources.

In embodiments, the ingestion system is configured to parse source data according to at least one of a specification of the source or a context of a supply chain for an ingestion instance of the source data. In embodiments, the ingestion system communicates ingested data, results of ingestion, and results of parsing, to an intelligent data layer control tower of the system. In embodiments, the location of the data source is a source address selected from a list of source addresses consisting of a universal record locator, port number, stream identifier, publication and/or broad channel, sensor output address. In embodiments, the analysis system compares data from the data source against a target use of intelligence derived from a data source to determine a degree of fitness for use of the data source by the intelligence deriving system. In embodiments, the analysis system analyzes ingestion system results for meeting at least one consumption target requirement of the consumer portal request. In embodiments, the consumption target requirement includes one or more of a validity time constraint, an accuracy constraint, a frequency of update constraint, or relevance to a consumption subject matter focus. In embodiments, the analysis system configures data regarding the ingested data for one or more system uses from a list of uses including advertisements that characterize the ingested data in terms of potential intelligence value, indexing schemes for offering intelligence derived data in a marketplace, searching intelligence derived data by identifying keywords, terms, and values associated with the ingested data. In embodiments, the analysis system estimates a value of intelligence data derived from the ingested data for a range of consumer portals to enable setting costs for consuming the intelligence data derived from the ingested data.

In embodiments, one or more systems of the intelligent data layer is configured as a micro-service architecture for isolated and independent operation of instances of the one or more systems for a plurality of distinct consumer portals. In embodiments, the one or more systems of the intelligent data layer system is initiated as a virtualized container to perform system-specific intelligent data layer system functions. In embodiments, the virtualized container is executed on a cloud-processing architecture. In embodiments, the virtualized container is configured with a consumer portal-specific instance of at least one of the ingestion system, the analysis system, or the intelligence deriving system. In embodiments, the intelligent data layer system ingests data from a plurality of types of data sources including data channels, on-demand data sources, and published data sources. In embodiments, the intelligent data layer system derives intelligence with the intelligence deriving system for a plurality of intelligence consumer portals. In embodiments, an intelligent data layer control tower adapts a configuration of the ingestion system based on a type of data source for a data source selected by the intelligent data layer control tower for each of a plurality of instances of ingestion. In embodiments, an intelligent data layer control tower adapts a configuration of the ingestion system, the analysis system, and the intelligence deriving system. In embodiments, the intelligent data layer ingests data differently from a single data source based on ingestion requirements accessible through the request. In embodiments, the intelligent data layer system further includes a plurality of system-focused probes that provide near real-time context of a range of aspects of system services. In embodiments, the system-focused probes include probes that monitor source data for source data impacting activity and that signal to an intelligent data layer control tower for taking action within the system based on a projected impact of the source data impacting activity. In embodiments, the system-focused probes monitor for time-related triggers for data sources, including early release of an update of source data, delayed release of an update of source data, and an announcement of new sources of data. In embodiments, the ingestion system monitors a port on a data network for an indication of data availability at a data source. In embodiments, the system develops a multi-dimensional understanding of source data value by applying a value determination cross matrix that facilitates mapping a data source-relevant value of the source data to a consumer portal-relevant value of the source data.

In embodiments, a method of operating an intelligent data layer includes: receiving an intelligence request from an intelligence consumer portal; determining at least one data source for deriving intelligence for the consumer portal based on the received request; configuring an ingestion system based on ingestion parameters and parsing rules in a layer configuration data store for the at least one data source; configuring an analysis system based on one or more analysis algorithms in the layer configuration data store for the at least one data source; configuring an intelligence deriving system based on information in the request and available intelligence services in an intelligence service system; and operating the system to ingest data from the at least one data source using the ingestion system, analyze the ingested data from the at least one data source using the analysis system, derive a set of intelligence data from at least one of the ingested data form the at least one data source and an outcome of using the analysis system, and communicating the set of intelligence data to at least one of the consumer portal or an intelligent data layer store. Some embodiments further include storing in a computer-readable storage system results of operations of one or more systems of the intelligent data layer. In embodiments, the one or more systems includes the ingestion system, the analysis system, and the intelligence deriving system. In embodiments, the results of operations include intermediate results of at least one of the one or more systems and at least one role-adapted final result variant of the intermediate results. In embodiments, configuring the analysis system is further based on consumer intelligence objectives of the request. In embodiments, configuring the analysis system is further based on aspects of the request. Some embodiments further include operating an intelligent data layer control tower that configures and operates the intelligent data layer by communicating control sequences with the ingestion system, the analysis system, and the intelligence deriving system. Some embodiments further include receiving, through an algorithm portal of an intelligent data layer control tower, at least one analysis algorithm used by the analysis system. In embodiments, the ingestion system applies the parsing rules to content of data sources to determine structure of the content and relationships among elements in the data. In embodiments, the ingestion system applies the parsing rules to content of data sources thereby generating characterization data that includes an intended meaning of elements of the data and relationships among the data, structures of the data, and meaning of the data parsed from the content. In embodiments, the ingestion system assigns a relationship attribute to a pair of data values that are configured as parent/child in a hierarchy of the data source. In embodiments, the ingestion system is configured to maintain a schedule of collection activity for one or more data sources. In embodiments, the ingestion system is configured to parse source data according to at least one of a specification of the source or a context of a supply chain for an ingestion instance of the source data. In embodiments, the ingestion system communicates ingested data, results of ingestion, and results of parsing, to an intelligent data layer control tower of the system.

In embodiments, a location of the data source is a source address selected from a list of source address consisting of a universal record locator, port number, stream identifier, publication and/or broad channel, sensor output address. In embodiments, the analysis system compares data from the data source against a target use of intelligence derived from a data source to determine a degree of fitness for use of the data source by the intelligence deriving system. In embodiments, the analysis system analyzes ingestion system results for meeting at least one consumption target requirement of the consumer portal request. In embodiments, the consumption target requirement includes one or more of a validity time constraint, an accuracy constraint, a frequency of update constraint, or relevance to a consumption subject matter focus.

In embodiments, the analysis system configures data regarding the ingested data for one or more system uses from a list of uses including advertisements that characterize the ingested data in terms of potential intelligence value, indexing schemes for offering intelligence derived data in a marketplace, searching intelligence derived data by identifying keywords, terms, and values associated with the ingested data. In embodiments, the analysis system estimates a value of intelligence data derived from the ingested data for a range of consumer portals to enable setting costs for consuming the intelligence data derived from the ingested data. In embodiments, one or more systems of the intelligent data layer is configured as a micro-service architecture for isolated and independent operation of instances of the one or more systems for a plurality of distinct consumer portals. In embodiments, the one or more systems of the intelligent data layer system is initiated as a virtualized container to perform system-specific intelligent data layer system functions. In embodiments, the virtualized container is executed on a cloud-processing architecture. In embodiments, the virtualized container is configured with a consumer portal-specific instance of at least one of the ingestion system, the analysis system, or the intelligence deriving system. In embodiments, the intelligent data layer system ingests data from a plurality of types of data sources including data channels, on-demand data sources, and published data sources. In embodiments, the intelligent data layer derives intelligence with the intelligence deriving system for a plurality of intelligence consumer portals.

In embodiments, an intelligent data layer control tower adapts a configuration of the ingestion system based on a type of data source for a data source selected by the intelligent data layer control tower for each of a plurality of instances of ingestion. In embodiments, an intelligent data layer control tower adapts a configuration of the ingestion system, the analysis system, and the intelligence deriving system. In embodiments, the intelligent data layer ingests data differently from a single data source based on ingestion requirements accessible through the request. In embodiments, the intelligent data layer further includes a plurality of system-focused probes that provide near real-time context of a range of aspects of system services. In embodiments, the system-focused probes include probes that monitor source data for source data impacting activity and that signal to an intelligent data layer control tower for taking action within the system based on a projected impact of the source data impacting activity. In embodiments, the system-focused probes monitor for time-related triggers for data sources, including early release of an update of source data, delayed release of an update of source data, and an announcement of new sources of data. In embodiments, the ingestion system monitors a port on a data network for an indication of data availability at a data source. In embodiments, the intelligent data layer develops a multi-dimensional understanding of source data value by applying a value determination cross matrix that facilitates mapping a data source-relevant value of the source data to a consumer portal-relevant value of the source data.

Network of Intelligent Data Layers

In embodiments, a system of intelligent data layer network elements includes: a first intelligent data layer element deriving a first degree of source data intelligence from a first source of data; a second intelligent data layer element deriving a second degree of source data intelligence from a second source of data, the second source of data representing a context of the first source of data; a third intelligent data layer element forming an intelligent data layer network through interconnections with the first intelligent data layer element and the second intelligent data layer element and deriving composite intelligence by processing data from a local source of data with the first degree of source data intelligence received through the interconnections and the second degree of source data intelligence received through the interconnections; and a fourth intelligent data layer element extending the intelligent data layer network through interconnection with the third intelligent data layer element and deriving a set of intelligence data structures by processing data from a second local source with one or more of the first degree of source data intelligence, the second degree of source data intelligence, or the composite intelligence, where deriving a set of intelligence data structures is based on intelligent data structures requirements of an intelligent data layer consumer element of the set of intelligence data structures. In embodiments, the first intelligent data layer derives marketplace bidding activity intelligence, the second intelligent data layer derives marketplace settlement activity intelligence, and the third intelligent data layer derives the composite intelligence including relative impacts of changes in bidding activity on settlement terms. In embodiments, the data from the second local source is monitored marketplace regulatory compliance and the set of intelligence data structures includes analysis of regulatory compliance of at least one of the bidding activity intelligence, the settlement activity intelligence, and the composite intelligence. In embodiments, the data from the second local source includes one or more of, raw transaction data, analyzed transaction data, marketplace data, or financial data for a plurality of transactions in the monitored marketplace.

In embodiments, at least one intelligent data layer element includes an intelligent data layer control tower that configures and operates the at least one intelligent data layer element by communicating control sequences with an ingestion system that receives source data, an analysis system that evaluates a data output of the ingestion system, and an intelligence deriving system that produces a corresponding one of source data intelligence, composite intelligence, and the set of intelligence data structures. In embodiments, the ingestion system parses content of source data to determine structure of source data content and relationships among elements in the source data. In embodiments, the ingestion system parses a content of data sources resulting in generating characterization data that includes an intended meaning of data elements and relationships among the data elements, structures of the data, and the intended meaning of the data parsed from the content. In embodiments, the ingestion system assigns a relationship attribute to a pair of data values that are configured as parent/child in a hierarchy of a corresponding source of data. In embodiments, the ingestion system is configured to maintain a schedule of collection activity for one or more sources of data. In embodiments, the ingestion system is configured to parse source data according to at least one of a specification of the source or a context of a supply chain for an ingestion instance of the source data. In embodiments, the analysis system compares data from the source data against a target use of corresponding sourced data intelligence to determine a degree of fitness for use of the source of data by the intelligence deriving system. In embodiments, one or more intelligent data layer network elements in the system of intelligent data layer network elements is initiated as a virtualized container of system-specific intelligent data layer element functions.

In embodiments, the virtualized container is executed on a cloud-processing architecture. In embodiments, at least one of the intelligent data layer elements ingests data from a plurality of types of sources of data including data channels, on-demand data sources, and published data sources. In embodiments, the ingestion system monitors a port on a data network for an indication of data availability at a source of data. In embodiments, the set of intelligence data structures includes a multi-dimensional representation of source data value by applying a value determination cross matrix that facilitates mapping a data source-relevant value of the source data to a consumer portal-relevant value of the source data. In embodiments, a method of networking intelligent data layer elements including: deriving a first degree of source data intelligence from a first source of data with a first intelligent data layer element; deriving a second degree of source data intelligence with a second intelligent data layer element from a second source of data, the second source of data representing a context of the first source of data; forming an intelligent data layer network through interconnections of a third intelligent data layer element with the first intelligent data layer element and the second intelligent data layer element and deriving composite intelligence by processing data from a local source of data with the first degree of source data intelligence received through the interconnections and the second degree of source data intelligence received through the interconnections; and extending the intelligent data layer network through interconnection of a fourth intelligent data layer element with the third intelligent data layer element and deriving a set of intelligence data structures by processing data from a second local source with one or more of the first degree of source data intelligence, the second degree of source data intelligence, or the composite intelligence, where deriving a set of intelligence data structures is based on intelligent data structures requirements of an intelligent data layer consumer element of the set of intelligence data structures.

In embodiments, the first intelligent data layer derives marketplace bidding activity intelligence, the second intelligent data layer derives marketplace settlement activity intelligence, and the third intelligent data layer derives the composite intelligence including relative impacts of changes in bidding activity on settlement terms. In embodiments, the data from the second local source is monitored marketplace regulatory compliance data and the set of intelligence data structures includes analysis of regulatory compliance of at least one of the bidding activity intelligence, the settlement activity intelligence, and the composite intelligence. In embodiments, the data from the second local source includes one or more of, raw transaction data, analyzed transaction data, marketplace data, or financial data for a plurality of transactions in the monitored marketplace. In embodiments, at least one intelligent data layer element includes an intelligent data layer control tower that configures and operates the at least one intelligent data layer element by communicating control sequences with an ingestion system that receives source data, an analysis system that evaluates a data output of the ingestion system, and an intelligence deriving system that produces a corresponding one of source data intelligence, composite intelligence, and the set of intelligence data structures. In embodiments, the ingestion system parses content of source data to determine structure of source data content and relationships among elements in the source data. In embodiments, the ingestion system parses a content of data sources resulting in generating characterization data that includes an intended meaning of data elements and relationships among the data elements, structures of the data, and the intended meaning of the data parsed from the content. In embodiments, the ingestion system assigns a relationship attribute to a pair of data values that are configured as parent/child in a hierarchy of a corresponding source of data. In embodiments, the ingestion system is configured to maintain a schedule of collection activity for one or more sources of data. In embodiments, the ingestion system is configured to parse source data according to at least one of a specification of the source or a context of a supply chain for an ingestion instance of the source data. In embodiments, the analysis system compares data from the source data against a target use of corresponding sourced data intelligence to determine a degree of fitness for use of the source of data by the intelligence deriving system.

In embodiments, one or more intelligent data layer network elements is initiated as a virtualized container of system-specific intelligent data layer element functions. In embodiments, the virtualized container is executed on a cloud-processing architecture. In embodiments, at least one of the intelligent data layer elements ingests data from a plurality of types of sources of data including data channels, on-demand data sources, and published data sources. In embodiments, the ingestion system monitors a port on a data network for an indication of data availability at a source of data. In embodiments, the set of intelligence data structures includes a multi-dimensional representation of source data value by applying a value determination cross matrix that facilitates mapping a data source-relevant value of the source data to a consumer portal-relevant value of the source data.

Source Discovery Using an Intelligent Data Layer

In embodiments, a system for discovering data sources for an intelligent data layer includes: a computer-readable storage system that stores a source discovery data store that maintains a data store storing information about existing data sources; an ingestion system for capturing data from candidate data sources; an analysis system for evaluating content ingested from the candidate data sources for meeting one or more aspects of a target source discovery criteria; a similarity engine that produces a degree of similarity signal indicative of a degree of similarity of the candidate data source to at least one of the existing data sources; a relevance engine that produces a degree of usefulness signal indicative of a utility of the candidate source for producing at least one intelligence outcome; and an intelligent data layer control tower that applies artificial intelligence techniques for determining at least one of ingestion actions for the ingestion system and analysis actions for the analysis engine, and for making a determination of use of the candidate data source. In embodiments, the intelligent data layer control tower applies machine learning to train the artificial intelligence techniques. In embodiments, the intelligent data layer is integrated into a marketplace system of systems. In embodiments, the marketplace system of systems is an automated market orchestration system of systems. In embodiments, the intelligent data layer control tower determines that at least one integration action includes capturing information from and about candidate sources. In embodiments, the intelligent data layer control tower determines that at least one integration action includes advertising for candidate sources. In embodiments, the intelligent data layer control tower determines that at least one integration action includes contacting a plurality of known content sources with sets of criteria that are descriptive of a type of content. In embodiments, the ingestion system adapts at least a portion of a set of criteria for seeking a source of data by performing at least one of adjusting a range of a value that is descriptive of target source data, or broadening the set of criteria by abstracting at least one data requirement.

In embodiments, the intelligent data layer control tower suggests source content discovery criteria based on analysis of existing sources, based on requests for variation of intelligence from consumers of the intelligent data layer, and feedback relating to usefulness of existing sources. In embodiments, the ingestion system adapts an original ingestion profile for one or more existing data sources thereby causing ingestion of content from the one or more existing data sources that is excluded from ingestion under the original ingestion profile. In embodiments, the ingestion system filters data from the candidate data sources based on compliance with at least a portion of a target content ingestion criteria and forwards data from the candidate data source that is accepted through the filter to the analysis engine. In embodiments, the target content ingestion criteria includes requirements of a data format, a language, and a minimum precision. In embodiments, the ingestion system provides source discovery status information to the intelligent data layer control tower for candidate sources of data. In embodiments, the analysis system processes data forwarded by the ingestion system to determine compliance with source discovery criteria. In embodiments, the source discovery criteria includes consistency of source terminology. In embodiments, the source discovery criteria includes consistency of terminology in the candidate data source to terminology of at least one of the existing data sources.

In embodiments, the analysis system applies a data stabilization algorithm to a portion of the data from the candidate source, a result of which is compared to a data stability criteria of the source discovery criteria. In embodiments, the similarity engine determines a degree of similarity of a portion of the candidate source data and at least one existing source of data by comparing data values of the portion to data values of a portion of an existing source of data. In embodiments, a degree of usefulness signal includes a predicted impact on intelligence derivable from the candidate source used by one or more intelligence derivation algorithms.

In embodiments, the degree of usefulness signal includes an indication that a corresponding candidate source is to be added to a list of approved sources.

In embodiments, a method of discovering data sources for an intelligent data layer includes: storing a source discovery data store that maintains a data store storing information about existing data sources in a computer-readable storage system; capturing data from candidate data sources with an ingestion system; evaluating content ingested from the candidate data sources for meeting one or more aspects of a target source discovery criteria with an analysis system; producing a degree of similarity signal indicative of a degree of similarity of the candidate data source to at least one of the existing data sources with a similarity engine; producing a degree of usefulness signal indicative of a utility of the candidate source for producing at least one intelligence outcome with a relevance engine; and applying artificial intelligence techniques with an intelligent data layer control tower for determining at least one of ingestion actions for the ingestion system and analysis actions for the analysis engine, and for making a determination of use of the candidate data source. In embodiments, the intelligent data layer control tower applies machine learning to train the artificial intelligence techniques. In embodiments, the intelligent data layer is integrated into a marketplace system of systems. In embodiments, the marketplace system of systems is an automated market orchestration system of systems. In embodiments, the intelligent data layer control tower determines that at least one integration action includes capturing information from and about candidate sources. In embodiments, the intelligent data layer control tower determines that at least one integration action includes advertising for candidate sources. In embodiments, the intelligent data layer control tower determines that at least one integration action includes contacting a plurality of known content sources with sets of criteria that are descriptive of a type of content. In embodiments, the ingestion system adapts at least a portion of a set of criteria for seeking a source of data by performing at least one of adjusting a range of a value that is descriptive of target source data, or broadening the set of criteria by abstracting at least one data requirement.

In embodiments, the intelligent data layer control tower suggests source content discovery criteria based on analysis of existing sources, based on requests for variation of intelligence from consumers of the intelligent data layer, and feedback relating to usefulness of existing sources. In embodiments, the ingestion system adapts an original ingestion profile for one or more existing data sources thereby causing ingestion of content from the one or more existing data sources that is excluded from ingestion under the original ingestion profile. In embodiments, the ingestion system filters data from the candidate data sources based on compliance with at least a portion of a target content ingestion criteria and forwards data from the candidate data source that is accepted through the filter to the analysis engine. In embodiments, the target content ingestion criteria includes requirements of a data format, a language, and a minimum precision. In embodiments, the ingestion system provides source discovery status information to the intelligent data layer control tower for candidate sources of data. In embodiments, the analysis system processes data forwarded by the ingestion system to determine compliance with source discovery criteria. In embodiments, the source discovery criteria includes consistency of source terminology. In embodiments, the source discovery criteria includes consistency of terminology in the candidate data source to terminology of at least one of the existing data sources. In embodiments, the analysis system applies a data stabilization algorithm to a portion of the data from the candidate source, a result of which is compared to a data stability criteria of the source discovery criteria. In embodiments, the similarity engine determines a degree of similarity of a portion of the candidate source data and at least one existing source of data by comparing data values of the portion to data values of a portion of an existing source of data. In embodiments, a degree of usefulness signal includes a predicted impact on intelligence derivable from the candidate source used by one or more intelligence derivation algorithms. In embodiments, the degree of usefulness signal includes an indication that a corresponding candidate source is to be added to a list of approved sources.

Data and Networking Pipeline for Market Orchestration

In embodiments, a method of adapting a route for delivery of asset data to a marketplace orchestration interface through a network pipeline is embodied as a set of computer-readable instructions that is executed by a set of one or more processors and including: identifying a set of asset-centric network resources in the network pipeline, a portion of the set of asset-centric network resources providing an interface to an asset in a set of assets for which transactions are conducted in a marketplace, the interface to the asset further configured to facilitate delivery of the asset data from the asset through the network pipeline; identifying a set of marketplace-centric network resources in the network pipeline, a portion of the set of marketplace-centric network resources providing access to a transaction orchestration system interface, the transaction orchestration system interface configured for an operator to orchestrate a set of parameters for a set of transaction workflows of the marketplace involving the set of assets; adapting a network path within the network pipeline that enables delivery of the asset data from the asset in the set of assets through the portion of the set of asset-centric network resources and through the portion of the set of marketplace-centric network resources to the transaction orchestration system interface, where adapting the network path is based on one or more characteristics of the asset data and at least one performance parameter of the network path; and delivering the asset data from the asset through a set of infrastructure resources in the adapted network path to the transaction orchestration system interface.

In embodiments, the interface to an asset in a set of assets communicates with a native network interface of the asset. In embodiments, the interface to the asset in the set of assets communicates with an asset management resource. In embodiments, the asset data is provided by the asset management resource. In embodiments, the interface to an asset in a set of assets communicates with a digital twin of the asset. In embodiments, the asset data is provided by the digital twin. In embodiments, the set of assets include one or more assets selected from a list of assets consisting of electronic devices, non-electronic devices, digital rights, services, humans, robots, and on-demand built items. In embodiments, the set of assets includes at least one interface for a plurality of assets in the set of assets, where the asset data for the plurality of assets is provided to the network pipeline through the at least one interface. In embodiments, the set of asset-centric network resources in the network pipeline includes asset interfacing resources, an asset-centric network resource controller and an asset-localized network data store. In embodiments, the set of asset-centric network resources perform asset-centric data handling. In embodiments, a portion of the set of asset-centric network resources is configured by an asset resource controller to work cooperatively with an asset-centric data handling service for processing and storing the asset data in an asset-localized network data store. In embodiments, the asset resource controller configures the portion of the set of asset-centric network resources based on a result of analysis of the asset data by the asset-centric handling service. In embodiments, the asset resource controller retrieves the result of analysis from the asset-localized network data store. In embodiments, the set of marketplace-centric network resources includes at least one resource providing a service selected from a list of services consisting of electronic wallet services, digital twin services, enterprise database services, platform as a service platform services, computer aided design services, and video game services. In embodiments, adapting the network path is based on one or more security characteristics of the asset data. In embodiments, adapting the network path based on the one or more security characteristics of the data includes configuring a path through the network pipeline that avoids poor reputation network resources. In embodiments, adapting the network path is based on one or more jurisdiction characteristics of the asset data. In embodiments, adapting the network path based on the one or more jurisdiction characteristics of the data includes configuring a path through the network pipeline that avoids network resources based on a jurisdiction of the network resources.

In embodiments, the set of marketplace-centric network resources includes smart contract-centric network resources that provide an interface to a set of smart contracts. In embodiments, the set of marketplace-centric network resources includes workflow centric resources that provide an interface to a set workflow resources.

In embodiments, a system includes: a set of asset-centric network resources in a network pipeline, a portion of the set of asset-centric network resources providing an interface to an asset in a set of assets for which transactions are conducted in a marketplace, the interface to the asset further configured to facilitate delivery of asset data from the asset through the network pipeline; a set of marketplace-centric network resources in the network pipeline, a portion of the set of marketplace-centric network resources providing access to a transaction orchestration system interface, the transaction orchestration system interface configured for an operator to orchestrate a set of parameters for a set of transaction workflows of the marketplace involving the set of assets; and a set of computer-readable instructions that is executed by a set of one or more processors to adapt a network path within the network pipeline based on one or more characteristics of the asset data and at least one performance parameter of the network path thereby enabling delivery of the asset data from the asset in the set of assets through the portion of the set of asset-centric network resources and through the portion of the set of marketplace-centric network resources to the transaction orchestration system interface and to deliver the asset data from the asset through a set of infrastructure resources in the adapted network path to the transaction orchestration system interface. In embodiments, the interface to an asset in a set of assets communicates with a native network interface of the asset. In embodiments, the interface to the asset in the set of assets communicates with an asset management resource. In embodiments, the asset data is provided by the asset management resource. In embodiments, the interface to an asset in a set of assets communicates with a digital twin of the asset. In embodiments, the asset data is provided by the digital twin. In embodiments, the set of assets includes one or more assets selected from a list of assets consisting of electronic devices, non-electronic devices, digital rights, services, humans, robots, and on-demand built items. In embodiments, the set of assets includes at least one interface for a plurality of assets in the set of assets, where the asset data for the plurality of assets is provided to the network pipeline through the at least one interface. In embodiments, the set of asset-centric network resources in the network pipeline includes asset interfacing resources, an asset-centric network resource controller and an asset-localized network data store. In embodiments, the set of asset-centric network resources perform asset-centric data handling. In embodiments, a portion of the set of asset-centric network resources is configured by an asset resource controller to work cooperatively with an asset-centric data handling service for processing and storing the asset data in an asset-localized network data store. In embodiments, the asset resource controller configures the portion of the set of asset-centric network resources based on a result of analysis of the asset data by the asset-centric handling service. In embodiments, the asset resource controller retrieves the result of analysis from the asset-localized network data store. In embodiments, the set of marketplace-centric network resources includes at least one resource providing a service selected from a list of services consisting of electronic wallet services, digital twin services, enterprise database services, platform as a service platform services, computer aided design services, and video game services. In embodiments, to adapt the network path is based on one or more security characteristics of the asset data. In embodiments, to adapt the network path based on the one or more security characteristics of the data includes configuring a path through the network pipeline that avoids poor reputation network resources. In embodiments, to adapt the network path is based on one or more jurisdiction characteristics of the asset data. In embodiments, to adapt the network path based on the one or more jurisdiction characteristics of the data includes configuring a path through the network pipeline that avoids network resources based on a jurisdiction of the network resources. In embodiments, the set of marketplace-centric network resources includes smart contract-centric network resources that provide an interface to a set of smart contracts. In embodiments, the set of marketplace-centric network resources includes workflow centric resources that provide an interface to a set workflow resources.

In embodiments, a system includes: a network adaptation system that automatically constructs a network infrastructure path in a network pipeline to deliver data from an asset to a market orchestration recipient, the constructed network infrastructure path is automatically adapted based on one or more characteristics of the data from the asset and at least one performance parameter for the network infrastructure path; a network timing adaptation system that automatically adapts network infrastructure resources in a network pipeline that delivers data from the asset to the market orchestration recipient for orchestration of a transaction of the asset, where the network infrastructure resources are adapted based on at least one of a parameter of the transaction of the asset and a performance parameter of the network pipeline; a set of asset-centric network resources that facilitate ingestion of the data from the asset into the network pipeline; and a set of marketplace-centric network resources that facilitate delivery of the asset data from the adapted network pipeline to the market orchestration recipient. In embodiments, the network pipeline delivers the data from the asset to the market orchestration recipient for orchestration of a transaction of the asset. In embodiments, the network timing adaptation system adapts the network infrastructure resources in the network pipeline to satisfy a data delivery timing requirement associated with a transaction workflow for the asset. In embodiments, the market orchestration recipient is a smart contract that includes terms, conditions, and parameters for a set of transaction workflows involving the asset.

In embodiments, adapting the network infrastructure path is based on one or more security characteristics of the asset data. In embodiments, adapting the network path based on the one or more security characteristics of the data includes configuring a path through the network pipeline that avoids poor reputation network resources. In embodiments, constructing a network infrastructure path in a network pipeline includes adjusting a communication protocol that avoids exposing data from the asset in a context that gives meaning to the data. In embodiments, adjusting the communication protocol includes delivering a first portion of the asset data through a first network path and a second portion of the asset data through a second network path.

In embodiments, constructing a network infrastructure path in a network pipeline includes adapting the network path for delivering the data from the asset so that the network path changes over time. In embodiments, constructing a network infrastructure path in a network pipeline includes adapting the network path to include at least one infrastructure node that is different than infrastructure nodes used previously to deliver the data from the asset. In embodiments, constructing a network infrastructure path in a network pipeline includes adapting the network infrastructure path so that it is different than prior network infrastructure paths used to deliver the data from the asset that are recorded in a historical record of network paths for the asset data. In embodiments, adapting the network infrastructure path based on one or more characteristics of the data from the asset includes configuring a plurality of recipients for one or more portions of the data from the asset, where the plurality of recipients is determined from a transaction workflow for the asset.

In embodiments, a method embodied as a set of computer-readable instructions that is executed by a set of one or more processors and includes: constructing a network infrastructure path in a network pipeline with a network adaptation system to deliver data from an asset to a market orchestration recipient, the network infrastructure path automatically adapted based on one or more characteristics of the data from the asset and at least one performance parameter for the network infrastructure path; adapting network infrastructure resources in the network pipeline, with a network timing adaptation system, that delivers data from the asset to the market orchestration recipient, where the network infrastructure resources are adapted based on at least one of a parameter of a transaction of the asset and a performance parameter of the network pipeline; ingesting the data from the asset into the network pipeline with a set of asset-centric network resources; and delivering the asset data from the adapted network pipeline to the market orchestration recipient with a set of marketplace-centric network resources. In embodiments, the adapted network pipeline delivers the data from the asset to the market orchestration recipient for orchestration of a transaction of the asset. In embodiments, the network timing adaptation system adapts the network infrastructure resources in the network pipeline to satisfy a data delivery timing requirement associated with a transaction workflow for the asset. In embodiments, the market orchestration recipient is a smart contract that includes terms, conditions, and parameters for a set of transaction workflows involving the asset.

In embodiments, adapting the network path is based on one or more security characteristics of the asset data. In embodiments, adapting the network path based on the one or more security characteristics of the data includes configuring a path through the network pipeline that avoids poor reputation network resources. In embodiments, constructing a network infrastructure path in a network pipeline includes adjusting a communication protocol that avoids exposing data from the asset in a context that gives meaning to the data. In embodiments, adjusting the communication protocol includes delivering a first portion of the asset data through a first network path and a second portion of the asset data through a second network path. In embodiments, constructing a network infrastructure path in a network pipeline includes adapting the network path for delivering the data from the asset so that the network path changes over time. In embodiments, constructing a network infrastructure path in a network pipeline includes adapting the network path to include at least one infrastructure node that is different than infrastructure nodes used previously to deliver the data from the asset. In embodiments, constructing a network infrastructure path in a network pipeline includes adapting the network infrastructure path so that it is different than prior network infrastructure paths used to deliver the data from the asset that are recorded in a historical record of network paths for the asset data. In embodiments, adapting the network infrastructure path based on one or more characteristics of the data from the asset includes configuring a plurality of recipients for one or more portions of the data from the asset, where the plurality of recipients is determined from a transaction workflow for the asset.

Asset-Centric Network Pipeline Infrastructure Resources (Operator Interface))

In embodiments, a system of network infrastructure resources includes: a first network interface connecting a set of the network infrastructure resources to an asset network resource; a second network interface connecting the set of network infrastructure resources to a second set of network infrastructure resources forming a portion of a network path for delivering data from the asset to a marketplace orchestration system interface, the network path automatically adapted to deliver the data from the asset to the marketplace orchestration system interface based on one or more characteristics of the data from the asset and at least one performance parameter for the network path; an asset-centric controller communicating with the asset through the first network interface and controlling delivery of the data from the asset over the adapted network path; an asset-centric data handling system communicating with the asset through the first network interface and processing the data from the asset in support of delivery of the data from the asset over the adapted network path; and an asset-centric data storage facility controlled by the asset-centric controller to receive data processed by the asset-centric data handling system, where data stored in the asset-centric data storage facility is accessible through the second interface by a portion of the second set of network infrastructure resources for delivering data from the asset to the marketplace orchestration system interface. In embodiments, the network path is further automatically adapted to adjust timing of delivery of data from the asset to the marketplace orchestration system interface based on at least one of a transaction parameter and a network performance parameter. In embodiments, the first network interface communicates with a native network interface of the asset. In embodiments, the first network interface communicates with an asset management resource. In embodiments, the asset data is provided by the asset management resource. In embodiments, the first network interface communicates with a digital twin of the asset. In embodiments, the data from the asset is provided by the digital twin. In embodiments, the asset-centric controller configures the first network interface based on a result of analysis of the data from the asset by the asset-centric data handling system. In embodiments, the asset-centric controller retrieves the result of analysis from the asset-centric data storage facility. In embodiments, the network path is further automatically adapted based on one or more security characteristics of the data from the asset. In embodiments, further automatically adapting the network path based on the one or more security characteristics of the data includes configuring the network path to avoid poor reputation network resources. In embodiments, the automatically adapted network path includes an adapted communication protocol that avoids exposing data from the asset in a context that gives meaning to the data. In embodiments, adjusting the adapted communication protocol delivers a first portion of the data from the asset through a first network path and a second portion of the data from the asset through a second network path. In embodiments, the automatically adapted network path for delivering the data from the asset changes over time. In embodiments, the automatically adapted network path is different than prior network infrastructure paths used to deliver the data from the asset that are recorded in a historical record of network paths for the data from the asset. In embodiments, the asset-centric controller configures the first network interface and the asset-centric data handling system so delivery of the data from the asset over the adapted network path is independent of how data from the asset is received from the asset by the first network communication interface.

In embodiments, the marketplace orchestration system interface is a set of smart contracts that includes terms, conditions, and parameters for a set of transaction workflows involving the asset. In embodiments, the marketplace orchestration system interface is an interface through which an operator orchestrates parameters of a set of transaction workflows associated with transactions for the assets. In embodiments, the operator orchestrates parameters of a set of transaction workflows based on the data from the asset. In embodiments, the marketplace orchestration system interface is adapted to facilitate orchestrating parameters of a set of transaction workflows involving the assets.

In embodiments, a method includes: connecting via a first network interface a set of network infrastructure resources to an asset; connecting via a second network interface the set of network infrastructure resources to a second set of network infrastructure resources forming a portion of a network path for delivering data from the asset to a marketplace orchestration system interface, the network path automatically adapted to deliver the data from the asset to the marketplace orchestration system interface based on one or more characteristics of the data from the asset and at least one performance parameter for the network path; controlling delivery of the data from the asset over the adapted network path with an asset-centric controller disposed to communicate with the asset through the first network interface; processing the data from the asset in support of delivery of the data from the asset over the adapted network path with an asset-centric data handling system disposed to communicate with the asset through the first network interface; and storing data processed by the asset-centric data handling system in an asset-centric data storage facility controlled by the asset-centric controller, where data stored in the asset-centric data storage facility is accessible through the second interface by a portion of the second set of network infrastructure resources for delivering data from the asset to the marketplace orchestration system interface.

In embodiments, the network path is further automatically adapted to adjust timing of delivery of data from the asset to the marketplace orchestration system interface based on at least one of a transaction parameter and a network performance parameter. In embodiments, the first network interface communicates with a native network interface of the asset. In embodiments, the first network interface communicates with an asset management resource. In embodiments, the asset data is provided by the asset management resource. In embodiments, the first network interface communicates with a digital twin of the asset. In embodiments, the data from the asset is provided by the digital twin. In embodiments, the asset-centric controller configures the first network interface based on a result of analysis of the data from the asset by the asset-centric data handling system. In embodiments, the asset-centric controller retrieves the result of analysis from the asset-centric data storage facility. In embodiments, the network path is further automatically adapted based on one or more security characteristics of the data from the asset. In embodiments, further automatically adapting the network path based on the one or more security characteristics of the data includes configuring the network path to avoid poor reputation network resources. In embodiments, the automatically adapted network path includes an adapted communication protocol that avoids exposing data from the asset in a context that gives meaning to the data. In embodiments, adjusting the adapted communication protocol delivers a first portion of the data from the asset through a first network path and a second portion of the data from the asset through a second network path. In embodiments, the automatically adapted network path for delivering the data from the asset changes over time. In embodiments, the automatically adapted network path is different than prior network infrastructure paths used to deliver the data from the asset that are recorded in a historical record of network paths for the data from the asset. In embodiments, the asset-centric controller configures the first network interface and the asset-centric data handling system so delivery of the data from the asset over the adapted network path is independent of how data from the asset is received from the asset by the first network communication interface.

In embodiments, the marketplace orchestration system interface is a set of smart contracts that includes terms, conditions, and parameters for a set of transaction workflows involving the asset. In embodiments, the marketplace orchestration system interface is an interface through which an operator orchestrates parameters of a set of transaction workflows associated with transactions for the assets. In embodiments, the operator orchestrates parameters of a set of transaction workflows based on the data from the asset. In embodiments, the marketplace orchestration system interface is adapted to facilitate orchestrating parameters of a set of transaction workflows involving the assets.

Adapted Path in a Network Pipeline with Integrated Marketplace APIs for Orchestration by an Operator In embodiments, a system includes: a network adaptation system that automatically adapts a network infrastructure path from an asset to a market orchestration recipient in a network pipeline that delivers asset data from the asset to the recipient, the network infrastructure path automatically adapted based on one or more characteristics of the asset data and at least one performance parameter for the network path; a set of asset-centric network resources that facilitate ingestion of the data from the asset into the adapted network pipeline; a set of marketplace-centric network resources that facilitate delivery of the asset data of the adapted network pipeline to the market orchestration recipient; and a set of application programming interfaces for a marketplace that executes transaction workflows for conducting a transaction for the asset based on workflow parameters determined by the market orchestration recipient, the set of application programming interfaces integrated into an auxiliary system that includes a set of interfaces for activating a function of the auxiliary system that when activated sends a transaction workflow activation signal to the marketplace through the set of integrated application programming interfaces, where a portion of the transaction workflows is activated.

In embodiments, the auxiliary system is an electronic wallet platform and the function is a transaction settlement function that, when activated causes activation of the portion of the transaction workflows in the marketplace. In embodiments, the transaction settlement function signals to the marketplace to activate the portion of the transaction workflows through the integrated set of application programming interfaces. In embodiments, the auxiliary system is a digital twin platform and the function is a digital twin of a function of the asset that, when activated causes activation of the portion of the transaction workflows in the marketplace. In embodiments, the digital twin of the function of the asset signals to the marketplace to activate the portion of the transaction workflows through the integrated set of application programming interfaces. In embodiments, the auxiliary system is an enterprise database platform and the function is a database update detection function that, when activated causes activation of the portion of the transaction workflows in the marketplace. In embodiments, the database update detection function signals to the marketplace to activate the portion of the transaction workflows through the integrated set of application programming interfaces. In embodiments, the auxiliary system is a platform as-a-service platform and the function monitors a status of a service that, when activated causes activation of the portion of the transaction workflows in the marketplace. In embodiments, the function that monitors a status of a service signals to the marketplace to activate the portion of the transaction workflows through the integrated set of application programming interfaces. In embodiments, the auxiliary system is a computer aided design platform and the function is an automated design function that, when activated causes activation of the portion of the transaction workflows in the marketplace. In embodiments, the automated design function signals to the marketplace to activate the portion of the transaction workflows through the integrated set of application programming interfaces. In embodiments, the auxiliary system is a video game platform and the function reflects an action by a user of the video game that, when activated causes activation of the portion of the transaction workflows in the marketplace. In embodiments, the function reflects an action by a user of the video game signals to the marketplace to activate the portion of the transaction workflows through the integrated set of application programming interfaces.

Adapted Path in a Network Pipeline with Integrated Marketplace APIs for Orchestration by for a Smart Contract)

In embodiments, a method includes: adapting a network infrastructure path from an asset to a smart contract in a network pipeline with a network adaptation system, the adapted network pipeline delivering asset data from the asset to the smart contract, the network infrastructure path automatically adapted based on one or more characteristics of the asset data and at least one performance parameter for the network path; ingesting the data from the asset into the adapted network pipeline with a set of asset-centric network resources; delivering the ingested asset data of the adapted network pipeline to the smart contract with a set of marketplace-centric network resources; and activating a portion of a set of transaction workflows with a set of application programming interfaces for a marketplace that executes transaction workflows for conducting a transaction for the asset based on workflow parameters determined by the smart contract, the set of application programming interfaces integrated into an auxiliary system that includes a set of interfaces for activating a function of the auxiliary system that when activated sends a transaction workflow activation signal to the marketplace through the set of integrated application programming interfaces, where the portion of the transaction workflows is activated.

In embodiments, the auxiliary system is an electronic wallet platform and the function is a transaction settlement function that, when activated causes activation of the portion of the transaction workflows in the marketplace. In embodiments, the transaction settlement function signals to the marketplace to activate the portion of the transaction workflows through the integrated set of application programming interfaces. In embodiments, the auxiliary system is a digital twin platform and the function is a digital twin of a function of the asset that, when activated causes activation of the portion of the transaction workflows in the marketplace. In embodiments, the digital twin of the function of the asset signals to the marketplace to activate the portion of the transaction workflows through the integrated set of application programming interfaces. In embodiments, the auxiliary system is an enterprise database platform and the function is a database update detection function that, when activated causes activation of the portion of the transaction workflows in the marketplace. In embodiments, the database update detection function signals to the marketplace to activate the portion of the transaction workflows through the integrated set of application programming interfaces. In embodiments, the auxiliary system is a platform as-a-service platform and the function monitors a status of a service that, when activated causes activation of the portion of the transaction workflows in the marketplace. In embodiments, the function that monitors a status of a service signals to the marketplace to activate the portion of the transaction workflows through the integrated set of application programming interfaces. In embodiments, the auxiliary system is a computer aided design platform and the function is an automated design function that, when activated causes activation of the portion of the transaction workflows in the marketplace. In embodiments, the automated design function signals to the marketplace to activate the portion of the transaction workflows through the integrated set of application programming interfaces. In embodiments, the auxiliary system is a video game platform and the function reflects an action by a user of the video game that, when activated causes activation of the portion of the transaction workflows in the marketplace. In embodiments, the function reflects an action by a user of the video game signals to the marketplace to activate the portion of the transaction workflows through the integrated set of application programming interfaces.

Adapted Timing of a Path in a Network Pipeline with Integrated Marketplace APIs

In embodiments, a system includes: a network timing adaptation system that automatically adapts timing of data transfer through a network pipeline that delivers data from an asset to a market orchestration recipient by adapting one or more network resources of the network pipeline to control data transfer within the network pipeline, the timing of data transfer associated with a time requirement for a transaction of the asset, where the one or more network resources are adapted based on at least one of a parameter of the transaction of the asset and a performance parameter of the network pipeline; a set of asset-centric network resources that facilitate ingestion of the data from the asset into the network pipeline; a set of marketplace-centric network resources that facilitate delivery of the ingested asset data of the adapted network pipeline to the market orchestration recipient; a set of application programming interfaces for a marketplace that executes transaction workflows for conducting a transaction for the asset based on workflow parameters determined by the market orchestration recipient according to data from the asset that is delivered through the adapted one or more network infrastructure resources, the set of application programming interfaces integrated into an auxiliary system that includes a set of interfaces for activating a function of the auxiliary system that when activated sends a transaction workflow activation signal to the marketplace through the integrated application programming interfaces whereby a portion of the transaction workflows is activated.

In embodiments, the auxiliary system is an electronic wallet platform and the function is a transaction settlement function that, when activated causes activation of the portion of the transaction workflows in the marketplace. In embodiments, the transaction settlement function signals to the marketplace to activate the portion of the transaction workflows through the integrated set of application programming interfaces. In embodiments, the auxiliary system is a digital twin platform and the function is a digital twin of a function of the asset that, when activated causes activation of the portion of the transaction workflows in the marketplace. In embodiments, the digital twin of the function of the asset signals to the marketplace to activate the portion of the transaction workflows through the integrated set of application programming interfaces. In embodiments, the auxiliary system is an enterprise database platform and the function is a database update detection function that, when activated causes activation of the portion of the transaction workflows in the marketplace. In embodiments, the database update detection function signals to the marketplace to activate the portion of the transaction workflows through the integrated set of application programming interfaces. In embodiments, the auxiliary system is a platform as-a-service platform and the function monitors a status of a service that, when activated causes activation of the portion of the transaction workflows in the marketplace. In embodiments, the function that monitors a status of a service signals to the marketplace to activate the portion of the transaction workflows through the integrated set of application programming interfaces. In embodiments, the auxiliary system is a computer aided design platform and the function is an automated design function that, when activated causes activation of the portion of the transaction workflows in the marketplace. In embodiments, the automated design function signals to the marketplace to activate the portion of the transaction workflows through the set of application programming interfaces. In embodiments, the auxiliary system is a video game platform and the function reflects an action by a user of the video game that, when activated causes activation of the portion of the transaction workflows in the marketplace. In embodiments, the function reflects an action by a user of the video game signals to the marketplace to activate the portion of the transaction workflows through the set of application programming interfaces.

Adapted Timing of a Path in a Network Pipeline with Integrated Marketplace APIs for a Smart Contact)

In embodiments, a method includes: adapting timing of data transfer through a network pipeline that delivers data from an asset to a smart contract with a network timing adaptation system by adapting one or more network resources of the network pipeline to control data transfer within the network pipeline, the timing of data transfer associated with a time requirement for a transaction of the asset determined by the smart contract, where the one or more network resources are adapted based on at least one of a parameter of the transaction of the asset and a performance parameter of the network pipeline; ingesting the data from the asset into the network pipeline with a set of asset-centric network resources; delivering the ingested asset data of the adapted network pipeline to the smart contract with a set of marketplace-centric network resources; activating a portion of a set of transaction workflows of the transaction of the asset determined by the smart contract with a set of application programming interfaces for a marketplace that executes the set of transaction workflows based on workflow parameters determined by the smart contract according to data from the asset that is delivered through the adapted one or more network infrastructure resources, the set of application programming interfaces integrated into an auxiliary system that includes a set of interfaces for activating a function of the auxiliary system that when activated sends a transaction workflow activation signal to the marketplace through the integrated application programming interfaces whereby the portion of the set of transaction workflows is activated.

In embodiments, the auxiliary system is an electronic wallet platform and the function is a transaction settlement function that, when activated causes activation of the portion of the transaction workflows in the marketplace. In embodiments, the transaction settlement function signals to the marketplace to activate the portion of the transaction workflows through the integrated set of application programming interfaces. In embodiments, the auxiliary system is a digital twin platform and the function is a digital twin of a function of the asset that, when activated causes activation of the portion of the transaction workflows in the marketplace. In embodiments, the digital twin of the function of the asset signals to the marketplace to activate the portion of the transaction workflows through the integrated set of application programming interfaces. In embodiments, the auxiliary system is an enterprise database platform and the function is a database update detection function that, when activated causes activation of the portion of the transaction workflows in the marketplace. In embodiments, the database update detection function signals to the marketplace to activate the portion of the transaction workflows through the integrated set of application programming interfaces. In embodiments, the auxiliary system is a platform as-a-service platform and the function monitors a status of a service that, when activated causes activation of the portion of the transaction workflows in the marketplace. In embodiments, the function that monitors a status of a service signals to the marketplace to activate the portion of the transaction workflows through the integrated set of application programming interfaces. In embodiments, the auxiliary system is a computer aided design platform and the function is an automated design function that, when activated causes activation of the portion of the transaction workflows in the marketplace. In embodiments, the automated design function signals to the marketplace to activate the portion of the transaction workflows through the integrated set of application programming interfaces. In embodiments, the auxiliary system is a video game platform and the function reflects an action by a user of the video game that, when activated causes activation of the portion of the transaction workflows in the marketplace. In embodiments, the function reflects an action by a user of the video game signals to the marketplace to activate the portion of the transaction workflows through the integrated set of application programming interfaces.

Market Prediction

In embodiments, a market prediction system includes: a machine learning system that trains a set of machine-learned models to generate a market prediction using training data including demand features and outcomes; an artificial intelligence system that receives a request to generate a market prediction and outputs a market prediction based on the machine-learned models and the request. In embodiments, the market prediction is a prediction for a parameter of demand in a forward market for an asset. In embodiments, the market prediction is a prediction for a parameter of supply in a forward market for an asset. In embodiments, the market prediction is a prediction of a set of terms and/or conditions for a smart contract. In embodiments, the market prediction is based at least in part on crowdsourced data. In embodiments, the market prediction is based at least in part on behavioral data collected from a set of IoT systems monitoring a set of entities in a set of environments. In embodiments, the artificial intelligence system includes a recurrent neural network. In embodiments, the artificial intelligence system includes a convolutional neural network. In embodiments, the artificial intelligence system includes a combination of a recurrent neural network and a convolutional neural network. In embodiments, the set of Internet of Things systems includes a set of smart home Internet of Things devices. In embodiments, the set of Internet of Things systems includes a set of workplace Internet of Things devices. In embodiments, the set of Internet of Things systems includes a set of Internet of Things device to monitor a set of consumer goods stores. In embodiments, the set of entities comprises one or more of: products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, and port infrastructure facilities.

In embodiments, the set of environments comprises one or more of: home of a consumer, retail facilities, manufacturing facilities, supply chain facilities, ship containers, ship, boat, barge, maritime port, crane, container, container handling facilities, shipyard, maritime dock, warehouse, distribution facilities, fulfillment facilities, fueling facilities, refueling facilities, nuclear refueling facilities, waste removal facilities, food supply facilities, beverage supply facilities, drone facilities, robot facilities, autonomous vehicle, aircraft, automotive, truck, train, lift, forklift, hauling facilities, conveyor, loading dock, waterway, bridge, tunnel, airport, depot, vehicle station, train station, weigh station, inspection station or point, roadway, railway, highway, customs house, and border control facilities.

In embodiments, a market prediction system includes: A quantum computing system that receives a request to generate a market prediction and outputs a market prediction based on the request. In embodiments, the market prediction is a prediction for a parameter of demand in a forward market for an asset. In embodiments, the market prediction is a prediction for a parameter of supply in a forward market for an asset. In embodiments, the market prediction is a prediction of a set of terms and/or conditions for a smart contract. In embodiments, the market prediction is based at least in part on crowdsourced data. In embodiments, the market prediction is based at least in part on behavioral data collected from a set of IoT systems monitoring a set of entities in a set of environments. In embodiments, the set of Internet of Things systems includes a set of smart home Internet of Things devices. In embodiments, the set of Internet of Things systems includes a set of workplace Internet of Things devices. In embodiments, the set of Internet of Things systems includes a set of Internet of Things device to monitor a set of consumer goods stores. In embodiments, the set of entities comprises one or more of: products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, and port infrastructure facilities. In embodiments, the set of environments comprises one or more of: home of a consumer, retail facilities, manufacturing facilities, supply chain facilities, ship containers, ship, boat, barge, maritime port, crane, container, container handling facilities, shipyard, maritime dock, warehouse, distribution facilities, fulfillment facilities, fueling facilities, refueling facilities, nuclear refueling facilities, waste removal facilities, food supply facilities, beverage supply facilities, drone facilities, robot facilities, autonomous vehicle, aircraft, automotive, truck, train, lift, forklift, hauling facilities, conveyor, loading dock, waterway, bridge, tunnel, airport, depot, vehicle station, train station, weigh station, inspection station or point, roadway, railway, highway, customs house, and border control facilities.

Market Orchestration and Alternative Lending Platform

A market orchestration platform includes: a machine learning system that trains a set of machine-learned models to cluster a set of smart contracts by attribute similarity using training data including smart contract features and outcomes; an artificial intelligence system that receives a request to cluster a set of smart contracts by attribute similarity and outputs a clustering of a set of smart contracts by attribute similarity based on the machine-learned models and the request; and a lending platform including: an Internet of Things data collection platform for monitoring at least one of a set of assets and a set of collateral for a loan, a bond, or a debt transaction.

Some embodiments further include a security monitoring system for monitoring assets and/or collateral based on the data collected by the Internet of Things data collection platform. In embodiments, the security monitoring system uses machine-learned models to determine the condition or value of items based on data collected by the Internet of Things data collection platform. In embodiments, the data collected by the Internet of Things data collection platform is image data, sensor data, or location data. Some embodiments further include a loan management system that enables a loan manager to access information from the Internet of Things data collection platform and the security monitoring system. In embodiments, the set of machine-learned models employ a convolutional neural network, a recurrent neural network, a feed forward neural network, a long-term/short-term memory (LTSM) neural network, a self-organizing neural network, and hybrids and combinations of the foregoing. In embodiments, the set of machine-learned models employ a convolutional neural network, a recurrent neural network, a feed forward neural network, a long-term/short-term memory (LTSM) neural network, a self-organizing neural network, and hybrids and combinations of the foregoing.

Market Prediction System and a Lending Platform

In embodiments, a market prediction system includes: a machine learning system that trains a set of machine-learned models to generate a market prediction using training data including market features and outcomes; an artificial intelligence system that receives a request to generate a market prediction and outputs a market prediction based on the machine-learned models and the request; and a lending platform including: an Internet of Things data collection platform for monitoring at least one of a set of assets and a set of collateral for a loan, a bond, or a debt transaction.

In embodiments, the market prediction is a prediction for a parameter of demand in a forward market for an asset. In embodiments, the market prediction is a prediction for a parameter of supply in a forward market for an asset. In embodiments, the market prediction is a prediction of a set of terms and/or conditions for a smart contract. In embodiments, the market prediction is based at least in part on crowdsourced data. In embodiments, the market prediction is based at least in part on behavioral data collected from a set of IoT systems monitoring a set of entities in a set of environments. In embodiments, the artificial intelligence system includes a recurrent neural network. In embodiments, the artificial intelligence system includes a convolutional neural network. In embodiments, the artificial intelligence system includes a combination of a recurrent neural network and a convolutional neural network. In embodiments, the set of Internet of Things systems includes a set of smart home Internet of Things devices. In embodiments, the set of Internet of Things systems includes a set of workplace Internet of Things devices. In embodiments, the set of Internet of Things systems includes a set of Internet of Things device to monitor a set of consumer goods stores. In embodiments, the set of entities comprises one or more of: products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, and port infrastructure facilities. In embodiments, the set of environments comprises one or more of: home of a consumer, retail facilities, manufacturing facilities, supply chain facilities, ship containers, ship, boat, barge, maritime port, crane, container, container handling facilities, shipyard, maritime dock, warehouse, distribution facilities, fulfillment facilities, fueling facilities, refueling facilities, nuclear refueling facilities, waste removal facilities, food supply facilities, beverage supply facilities, drone facilities, robot facilities, autonomous vehicle, aircraft, automotive, truck, train, lift, forklift, hauling facilities, conveyor, loading dock, waterway, bridge, tunnel, airport, depot, vehicle station, train station, weigh station, inspection station or point, roadway, railway, highway, customs house, and border control facilities.

Some embodiments further include a security monitoring system for monitoring assets and/or collateral based on the data collected by the Internet of Things data collection platform. In embodiments, the security monitoring system uses machine-learned models to determine the condition or value of items based on data collected by the Internet of Things data collection platform. In embodiments, the data collected by the Internet of Things data collection platform is image data, sensor data, or location data. Some embodiments further include a loan management system that enables a loan manager to access information from the Internet of Things data collection platform and the security monitoring system. In embodiments, the set of machine-learned models employ a convolutional neural network, a recurrent neural network, a feed forward neural network, a long-term/short-term memory (LTSM) neural network, a self-organizing neural network, and hybrids and combinations of the foregoing.

Enterprise Access Layer and Market Prediction System

In embodiments, a system includes: a machine learning system that trains a set of machine-learned models to generate a market prediction using training data including market features and outcomes; an artificial intelligence system that receives a request to generate a market prediction and outputs a market prediction based on the machine-learned models and the request; a network access layer including a processor and storage hardware in communication with the processor, where the storage hardware includes instructions that when executed by the processor perform operations, and where the operations include: monitoring a plurality of public market participants via an interface system of a network access layer, where the network access layer is controlled by an enterprise and corresponds to an intelligence system that hosts exchangeable enterprise digital assets; receiving, at the network access layer via the interface system, an indication that a monitored public market participant requests a digital asset candidate; determining, by the intelligence system of the network access layer, whether the digital asset candidate matches an asset available in a digital wallet system associated with the network access layer; and in response to the digital asset candidate matching the asset available in the digital wallet system: identifying a set of asset controls managed by a permission system of the network asset layer, where the permission system is configured to assign the set of asset controls to exchangeable enterprise digital assets in the digital wallet system; determining whether a transaction with the monitored public market participant that involves the asset available in the digital wallet system satisfies an asset control criteria corresponding to the asset available, where the asset control criteria indicates that a threshold number of the set of asset controls have been violated; and in response to determining that the transaction with the monitored public market participant that involves the asset available in the digital wallet system satisfies the asset control criteria, generating a message data packet requesting an actual transaction with the monitored public market participant involving the asset available, where the message data packet is configured for communication via the interface system.

In embodiments, the asset is available in a hot wallet of the digital wallet system. In embodiments, the asset is available in a cold wallet of the digital wallet system. In embodiments, the asset is available in a custodial wallet of the digital wallet system. In embodiments, the operations further comprise: receiving a response message from the monitored public market participant; and determining that the response message indicates an acknowledgement to fulfill the request for the actual transaction; and facilitating fulfillment of the actual transaction. In embodiments, facilitating fulfillment of the actual transaction includes storing a digital form of the asset in a public append-only data structure to represent execution of the actual transaction. In embodiments, facilitating fulfillment of the asset request includes: signing the actual transaction involving the asset on a cold wallet; and relaying the signed transaction using a hot wallet of the digital wallet system that is associated with the cold wallet. In embodiments, storing the digital form of the asset to a public append-only data structure facilitating uses at least one key from a hot wallet of the digital wallet system. In embodiments, storing the digital form of the asset to a public append-only data structure facilitating uses at least one key from a cold wallet of the digital wallet system. In embodiments, the market prediction is a prediction for a parameter of demand in a forward market for an asset. In embodiments, the market prediction is a prediction for a parameter of supply in a forward market for an asset. In embodiments, the market prediction is a prediction of a set of terms and/or conditions for a smart contract. In embodiments, the market prediction is based at least in part on crowdsourced data. In embodiments, the market prediction is based at least in part on behavioral data collected from a set of IoT systems monitoring a set of entities in a set of environments. In embodiments, the artificial intelligence system includes a recurrent neural network. In embodiments, the artificial intelligence system includes a convolutional neural network. In embodiments, the artificial intelligence system includes a combination of a recurrent neural network and a convolutional neural network. In embodiments, the set of Internet of Things systems includes a set of smart home Internet of Things devices. In embodiments, the set of Internet of Things systems includes a set of workplace Internet of Things devices. In embodiments, the set of Internet of Things systems includes a set of Internet of Things device to monitor a set of consumer goods stores.

In embodiments, the set of entities comprises one or more of: products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, and port infrastructure facilities. In embodiments, the set of environments comprises one or more of: home of a consumer, retail facilities, manufacturing facilities, supply chain facilities, ship containers, ship, boat, barge, maritime port, crane, container, container handling facilities, shipyard, maritime dock, warehouse, distribution facilities, fulfillment facilities, fueling facilities, refueling facilities, nuclear refueling facilities, waste removal facilities, food supply facilities, beverage supply facilities, drone facilities, robot facilities, autonomous vehicle, aircraft, automotive, truck, train, lift, forklift, hauling facilities, conveyor, loading dock, waterway, bridge, tunnel, airport, depot, vehicle station, train station, weigh station, inspection station or point, roadway, railway, highway, customs house, and border control facilities.

Market Orchestration and Enterprise Access Layer

In embodiments, a system includes: a machine learning system that trains a set of machine-learned models to cluster a set of smart contracts by attribute similarity using training data including smart contract features and outcomes; an artificial intelligence system that receives a request to cluster a set of smart contracts by attribute similarity and outputs a clustering of a set of smart contracts by attribute similarity based on the machine-learned models and the request; a network access layer including a processor and storage hardware in communication with the processor, where the storage hardware includes instructions that when executed by the processor perform operations, and where the operations include: monitoring a plurality of public market participants via an interface system of a network access layer, where the network access layer is controlled by an enterprise and corresponds to an intelligence system that hosts exchangeable enterprise digital assets; receiving, at the network access layer via the interface system, an indication that a monitored public market participant requests a digital asset candidate; determining, by the intelligence system of the network access layer, whether the digital asset candidate matches an asset available in a digital wallet system associated with the network access layer; and in response to the digital asset candidate matching the asset available in the digital wallet system: identifying a set of asset controls managed by a permission system of the network asset layer, where the permission system is configured to assign the set of asset controls to exchangeable enterprise digital assets in the digital wallet system; determining whether a transaction with the monitored public market participant that involves the asset available in the digital wallet system satisfies an asset control criteria corresponding to the asset available, where the asset control criteria indicates that a threshold number of the set of asset controls have been violated; and in response to determining that the transaction with the monitored public market participant that involves the asset available in the digital wallet system satisfies the asset control criteria, generating a message data packet requesting an actual transaction with the monitored public market participant involving the asset available, where the message data packet is configured for communication via the interface system.

In embodiments, the asset is available in a hot wallet of the digital wallet system. In embodiments, the asset is available in a cold wallet of the digital wallet system. In embodiments, the asset is available in a custodial wallet of the digital wallet system. In embodiments, the operations further comprise: receiving a response message from the monitored public market participant; and determining that the response message indicates an acknowledgement to fulfill the request for the actual transaction; and facilitating fulfillment of the actual transaction. In embodiments, facilitating fulfillment of the actual transaction includes storing a digital form of the asset in a public append-only data structure to represent execution of the actual transaction. In embodiments, facilitating fulfillment of the asset request includes: signing the actual transaction involving the asset on a cold wallet; and relaying the signed transaction using a hot wallet of the digital wallet system that is associated with the cold wallet. In embodiments, storing the digital form of the asset to a public append-only data structure facilitating uses at least one key from a hot wallet of the digital wallet system. In embodiments, storing the digital form of the asset to a public append-only data structure facilitating uses at least one key from a cold wallet of the digital wallet system. Some embodiments further include a security monitoring system for monitoring assets and/or collateral based on the data collected by the Internet of Things data collection platform. In embodiments, the security monitoring system uses machine-learned models to determine the condition or value of items based on data collected by the Internet of Things data collection platform. In embodiments, the data collected by the Internet of Things data collection platform is image data, sensor data, or location data.

Some embodiments further include a loan management system that enables a loan manager to access information from the Internet of Things data collection platform and the security monitoring system. In embodiments, the set of machine-learned models employ a convolutional neural network, a recurrent neural network, a feed forward neural network, a long-term/short-term memory (LTSM) neural network, a self-organizing neural network, and hybrids and combinations of the foregoing.

Market Orchestration and Market Prediction

In embodiments, a system includes: a machine learning system that trains a set of machine-learned models to generate a market prediction using training data including market features and outcomes; an artificial intelligence system that receives a request to generate a market prediction and outputs a market prediction based on the machine-learned models and the request; a machine learning system that trains a set of machine-learned models to cluster a set of smart contracts by attribute similarity using training data including smart contract features and outcomes; and an artificial intelligence system that receives a request to cluster a set of smart contracts by attribute similarity and outputs a clustering of a set of smart contracts by attribute similarity based on the machine-learned models and the request.

In embodiments, the market prediction is a prediction for a parameter of demand in a forward market for an asset. In embodiments, the market prediction is a prediction for a parameter of supply in a forward market for an asset. In embodiments, the market prediction is a prediction of a set of terms and/or conditions for a smart contract. In embodiments, the market prediction is based at least in part on crowdsourced data. In embodiments, the market prediction is based at least in part on behavioral data collected from a set of IoT systems monitoring a set of entities in a set of environments. In embodiments, the artificial intelligence system includes a recurrent neural network. In embodiments, the artificial intelligence system includes a convolutional neural network. In embodiments, the artificial intelligence system includes a combination of a recurrent neural network and a convolutional neural network. In embodiments, the set of Internet of Things systems includes a set of smart home Internet of Things devices. In embodiments, the set of Internet of Things systems includes a set of workplace Internet of Things devices. In embodiments, the set of Internet of Things systems includes a set of Internet of Things device to monitor a set of consumer goods stores.

In embodiments, the set of entities comprises one or more of: products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, and port infrastructure facilities.

In embodiments, the set of environments comprises one or more of: home of a consumer, retail facilities, manufacturing facilities, supply chain facilities, ship containers, ship, boat, barge, maritime port, crane, container, container handling facilities, shipyard, maritime dock, warehouse, distribution facilities, fulfillment facilities, fueling facilities, refueling facilities, nuclear refueling facilities, waste removal facilities, food supply facilities, beverage supply facilities, drone facilities, robot facilities, autonomous vehicle, aircraft, automotive, truck, train, lift, forklift, hauling facilities, conveyor, loading dock, waterway, bridge, tunnel, airport, depot, vehicle station, train station, weigh station, inspection station or point, roadway, railway, highway, customs house, and border control facilities.

Some embodiments further include a security monitoring system for monitoring assets and/or collateral based on the data collected by the Internet of Things data collection platform.

In embodiments, the security monitoring system uses machine-learned models to determine the condition or value of items based on data collected by the Internet of Things data collection platform. In embodiments, the data collected by the Internet of Things data collection platform is image data, sensor data, or location data. Some embodiments further include a loan management system that enables a loan manager to access information from the Internet of Things data collection platform and the security monitoring system. In embodiments, the set of machine-learned models employ a convolutional neural network, a recurrent neural network, a feed forward neural network, a long-term/short-term memory (LTSM) neural network, a self-organizing neural network, and hybrids and combinations of the foregoing.

Data and network infrastructure pipeline with market orchestration

In embodiments, a system includes: a network adaptation system that automatically constructs a network infrastructure path in a network pipeline to deliver data from an asset to a market orchestration recipient, the constructed network infrastructure path is automatically adapted based on one or more characteristics of the data from the asset and at least one performance parameter for the network infrastructure path; a network timing adaptation system that automatically adapts network infrastructure resources in a network pipeline that delivers data from the asset to the market orchestration recipient for orchestration of a transaction of the asset, where the network infrastructure resources are adapted based on at least one of a parameter of the transaction of the asset and a performance parameter of the network pipeline; a set of asset-centric network resources that facilitate ingestion of the data from the asset into the network pipeline; a set of marketplace-centric network resources that facilitate delivery of the asset data from the adapted network pipeline to the market orchestration recipient; a machine learning system that trains a set of machine-learned models to cluster a set of smart contracts by attribute similarity using training data including smart contract features and outcomes; and an artificial intelligence system that receives a request to cluster a set of smart contracts by attribute similarity and outputs a clustering of a set of smart contracts by attribute similarity based on the machine-learned models and the request.

In embodiments, the network pipeline delivers the data from the asset to the market orchestration recipient for orchestration of a transaction of the asset. In embodiments, the network timing adaptation system adapts the network infrastructure resources in the network pipeline to satisfy a data delivery timing requirement associated with a transaction workflow for the asset. In embodiments, the market orchestration recipient is a smart contract that includes terms, conditions, and parameters for a set of transaction workflows involving the asset.

In embodiments, adapting the network infrastructure path is based on one or more security characteristics of the asset data. In embodiments, adapting the network path based on the one or more security characteristics of the data includes configuring a path through the network pipeline that avoids poor reputation network resources. In embodiments, constructing a network infrastructure path in a network pipeline includes adjusting a communication protocol that avoids exposing data from the asset in a context that gives meaning to the data. In embodiments, adjusting the communication protocol includes delivering a first portion of the asset data through a first network path and a second portion of the asset data through a second network path. In embodiments, constructing a network infrastructure path in a network pipeline includes adapting the network path for delivering the data from the asset so that the network path changes over time. In embodiments, constructing a network infrastructure path in a network pipeline includes adapting the network path to include at least one infrastructure node that is different than infrastructure nodes used previously to deliver the data from the asset. In embodiments, constructing a network infrastructure path in a network pipeline includes adapting the network infrastructure path so that it is different than prior network infrastructure paths used to deliver the data from the asset that are recorded in a historical record of network paths for the asset data. In embodiments, adapting the network infrastructure path based on one or more characteristics of the data from the asset includes configuring a plurality of recipients for one or more portions of the data from the asset, where the plurality of recipients is determined from a transaction workflow for the asset.

Trust Networks and Enterprise Access Layers

In embodiments, a system includes: a computer-readable medium that stores a set of executable instructions; a processing system that executes an enterprise access layer that executes transactions on behalf of an enterprise having a plurality of different users, where the enterprise access layer includes a wallet system, a workflow system, and a permissions system, where: the wallet system manages a plurality of digital wallets associated with the enterprise and is configured to: receive a transaction request initiated by a user device associated with a user of the plurality of users, the transaction request requesting a transaction to be executed by the wallet system and having a set of attributes corresponding to the transaction; select a wallet of the plurality of wallets to execute the transaction based on the set of attributes; and initiating a transaction workflow from a set of workflows based on the selected wallet; when the transaction is a trustless transaction performed on a distributed ledger, the workflow system is configured to: obtain a distributed ledger address of a counterparty to the trustless transaction; obtain a trust score based on the distributed ledger address of the counterparty; determine whether to execute the transaction based on the trust score corresponding to the counterparty and a role of the user within the enterprise; and in response to determining to allow the trustless transaction, instructing the wallet system to perform the trustless transaction from the selected wallet.

In embodiments, the workflow system provides a request to the permissions system to verify that the user is authorized to perform the transaction based on the role of the user and one or more transaction attributes. In embodiments, the workflow system provides a trust score request to a trust system, where the request indicates the distributed ledger address of the counterparty and the trust system returns the trust score. In embodiments, the trust system comprises a decentralized network of node computing devices, where each respective node computing device independently determines a local trust score for the distributed ledger address based on distributed ledger data available to the respective node computing device. In embodiments, the trust score is a consensus trust score that is based on the local trust scores determined by the respective node computing devices. In embodiments, the trust system comprises a centralized system that monitors a distributed network. In embodiments, the transaction workflow determines to execute the transaction in response to verifying that the user is authorized to perform the transaction and the trust score exceeding a trust threshold. In embodiments, in response to performing the trustless transaction, the wallet system generates a transaction record and stores the transaction record on a second distributed ledger. In embodiments, the second distributed ledger is a private distributed ledger maintained by the enterprise. In embodiments, the wallet system manages a set of private and public keys on behalf of the entity.

In embodiments, a method for executing user-initiated transactions on behalf of an enterprise having a plurality of different users includes: receiving, by a wallet system, a transaction request initiated by a user device associated with a user of the plurality of users, the transaction request requesting a transaction to be executed by the wallet system and having a set of attributes corresponding to the transaction; selecting, by the wallet system, a wallet of a plurality of digital wallets associated with the enterprise to execute the transaction based on the set of attributes; and initiating a transaction workflow from a set of workflows based on the selected wallet, where when the transaction is a trustless transaction performed on a distributed ledger, the selected workflow executes: obtaining a distributed ledger address of a counterparty to the trustless transaction; obtaining a trust score based on the distributed ledger address of the counterparty; determining whether to execute the transaction based on the trust score corresponding to the counterparty and a role of the user within the enterprise; and in response to determining to allow the trustless transaction, instructing the wallet system to perform the trustless transaction from the selected wallet.

In embodiments, the workflow system provides a request to the permissions system to verify that the user is authorized to perform the transaction based on the role of the user and one or more transaction attributes. In embodiments, the workflow system provides a trust score request to a trust system, where the request indicates the distributed ledger address of the counterparty and the trust system returns the trust score. In embodiments, the trust system comprises a decentralized network of node computing devices, where each respective node computing device independently determines a local trust score for the distributed ledger address based on distributed ledger data available to the respective node computing device. In embodiments, the trust score is a consensus trust score that is based on the local trust scores determined by the respective node computing devices. In embodiments, the trust system comprises a centralized system that monitors a distributed network. In embodiments, the transaction workflow determines to execute the transaction in response to verifying that the user is authorized to perform the transaction and the trust score exceeds a trust threshold. In embodiments, in response to performing the trustless transaction, the wallet system generates a transaction record and stores the transaction record on a second distributed ledger. In embodiments, the second distributed ledger is a private distributed ledger maintained by the enterprise. In embodiments, the wallet system manages a set of private and public keys on behalf of the entity.

Data and Network Infrastructure Pipeline and Intelligent Data Layers

An intelligent data layer system includes: a computer-readable storage system that stores a layer configuration data store that maintains: ingestion parameters including one or more data structures that represent aspects of one or more of a plurality of data sources including a source location, an interface protocol, a source data ontology, and an ingestion cost; parsing rules that facilitate determining one or more of structure, content, relationships among data elements, intended meaning of the data elements, or relationships of data, structure, and intended meaning; and one or more analysis algorithms; and a set of one or more processors that execute a set of computer-readable instructions, where the set of one or more processors collectively: receive an intelligence request pertaining to an asset in a set of assets from an intelligence consumer portal a set of marketplace-centric network resources that provide access to a transaction orchestration system interface; determine at least one data source for deriving intelligence for use by the transaction orchestration system interface based on the received request, the at least one data source being accessible on a computing network via a set of data source-centric network resources; configure an ingestion system based on the ingestion parameters and parsing rules in the layer configuration data store for ingesting data pertaining to the asset from the at least one data source via the set of data source-centric network resources; configure an analysis system based on the analysis algorithms in the layer configuration data store for the at least one data source; configure an intelligence deriving system based on information in the request and available intelligence services in an intelligence service system; operate the system to ingest data from the at least one data source using the ingestion system, analyze the ingested data from the at least one data source using the analysis system, and derive a set of intelligence data from at least one of the ingested data from the at least one data source or from an outcome of using the analysis system; adapt a network path from the intelligence deriving system through a network pipeline that enables delivery of the set of intelligence data to the transaction orchestration system interface based on one or more characteristics of the asset ingested from the at least one source and at least one performance parameter of the network path; and communicating the set of intelligence data through a set of infrastructure resources in the adapted network path to the transaction orchestration system interface.

An intelligent data layer system includes: a set of one or more processors that execute a set of computer-readable instructions, where the set of one or more processors collectively: receive an intelligence request pertaining to an asset in a set of assets from an intelligence consumer portal a set of marketplace-centric network resources that provide access to a transaction orchestration system interface; determine at least one data source pertaining to the asset and for deriving intelligence for use by the transaction orchestration system interface based on the received request, the at least one data source being accessible on a computing network via a set of asset-data source-centric network resources; configure an ingestion system based on a set of ingestion parameters and parsing rules from an ingestion system configuration data store, the ingestion system for ingesting data pertaining to the asset from the at least one data source via the set of asset-data source-centric network resources; configure an intelligence deriving system based on information in the request and available intelligence services in an intelligence service system to derive a set of intelligence data from at least one of the ingested data from the at least one data source; adapt a network path from the intelligence deriving system through a network pipeline that enables delivery of the set of intelligence data to the transaction orchestration system interface, where to adapt the network path is based on one or more characteristics of the asset captured from the at least one source and at least one performance parameter of the network path; and communicate the set of intelligence data through a set of infrastructure resources in the adapted network path to the transaction orchestration system interface.

In embodiments, the set of asset-data source-centric network resources is an asset management resource. In embodiments, the data pertaining to the asset is ingested from the asset management resource. In embodiments, the at least one data source pertaining to the asset is a digital twin of the asset. In embodiments, the data pertaining to the asset is provided by the digital twin. In embodiments, the set of asset-data source-centric network resources includes asset interfacing resources, an asset-centric network resource controller and an asset-localized network data store. In embodiments, the asset resource controller configures a portion of the set of asset-data source-centric network resources based on a result of analysis of the data pertaining to the asset data by the asset resource controller. In embodiments, the at least one data source pertaining to the asset is the asset. In embodiments, the network path is adapted based on one or more security characteristics of the data pertaining to the asset ingested from the at least one data source. In embodiments, the network path is adapted based on the one or more security characteristics of the data includes configuring a path through the network pipeline that avoids poor reputation network resources. In embodiments, the network path is adapted based on one or more jurisdiction characteristics of the asset data. In embodiments, the network path is adapted based on the one or more jurisdiction characteristics of the data includes configuring a path through the network pipeline that avoids network resources based on a jurisdiction of the network resources.

In embodiments, a method of providing intelligence for a transaction orchestration system through an intelligent data layer system includes: receiving an intelligence request pertaining to an asset in a set of assets from a set of marketplace-centric network resources that provide access to a transaction orchestration system interface; determining at least one data source pertaining to the asset and for deriving intelligence for use by the transaction orchestration system interface based on the received request, the at least one data source being accessible on a computing network via a set of asset-data source-centric network resources; configuring an ingestion system based on a set of ingestion parameters and parsing rules from an ingestion system configuration data store, the ingestion system for ingesting data pertaining to the asset from the at least one data source via the set of asset-data source-centric network resources; configuring an intelligence deriving system based on information in the request and available intelligence services in an intelligence service system to derive a set of intelligence data from at least one of the ingested data from the at least one data source; adapting a network path from the intelligence deriving system through a network pipeline that enables delivery of the set of intelligence data to the transaction orchestration system interface, where adapting the network path is based on one or more characteristics of the asset captured from the at least one source and at least one performance parameter of the network path; and communicating the set of intelligence data through a set of infrastructure resources in the adapted network path to the transaction orchestration system interface.

In embodiments, the set of asset-data source-centric network resources is an asset management resource. In embodiments, the data pertaining to the asset is ingested from the asset management resource. In embodiments, the at least one data source pertaining to the asset is a digital twin of the asset. In embodiments, the data pertaining to the asset is provided by the digital twin. In embodiments, the set of asset-data source-centric network resources includes asset interfacing resources, an asset-centric network resource controller and an asset-localized network data store. In embodiments, the asset resource controller configures a portion of the set of asset-data source-centric network resources based on a result of analysis of the data pertaining to the asset data by the asset resource controller. In embodiments, the at least one data source pertaining to the asset is the asset. In embodiments, the network path is adapted based on one or more security characteristics of the data pertaining to the asset ingested from the at least one data source.

Enterprise Access Layers and Data Pipeline

A computer-implemented method includes: monitoring a plurality of public market participants via an interface system of a network access layer, where the network access layer is controlled by an enterprise and corresponds to an intelligence system that hosts exchangeable enterprise digital assets; receiving, at the network access layer via the interface system, an indication that a monitored public market participant requests a digital asset candidate; identifying a digital wallet system associated with the network access layer, the digital wallet system making available a digital asset of a set of assets for which transactions are conducted in a marketplace, the digital wallet further configured to facilitate delivery of the digital asset through a network pipeline associated with the network access layer to an interface of the marketplace; determining, by the intelligence system of the network access layer, whether the digital asset candidate matches the digital asset available in the digital wallet system; and in response to the digital asset candidate matching the asset available in the digital wallet system: identifying a set of asset controls managed by a permission system of the network asset layer, where the permission system is configured to assign the set of asset controls to exchangeable enterprise digital assets in the digital wallet system; determining whether a transaction targeted for the marketplace based on a set of parameters for a set of digital asset transaction workflows of the marketplace that are orchestrated by an operator through a transaction orchestration interface the transaction with the monitored public market participant and involving the asset available in the digital wallet system satisfies an asset control criteria corresponding to the asset available, where the asset control criteria indicates that a threshold number of the set of asset controls have been violated; and in response to determining that the transaction with the monitored public market participant that involves the asset available in the digital wallet system satisfies the asset control criteria: adapting a network path within the network pipeline that enables delivery of the digital asset to the transaction orchestration system interface, where adapting the network path is based on one or more characteristics of the digital asset and at least one performance parameter of the network path; and delivering the digital asset and a message requesting an actual transaction with the monitored public market participant involving the asset available from the interface system to the transaction orchestration system interface via the adapted network path.

Some embodiments further include: receiving a message from the monitored public market participant that indicates an acknowledgement to fulfill the request for the actual transaction; and facilitating fulfillment of the actual transaction in the marketplace. In embodiments, facilitating fulfillment of the actual transaction includes storing a digital form of the digital asset in a public append-only data structure to represent execution of the actual transaction. In embodiments, facilitating fulfillment of the actual transaction includes: signing the actual transaction involving the asset on a cold wallet; and relaying the signed transaction using a hot wallet of the digital wallet system that is associated with the cold wallet. In embodiments, storing the digital form of the asset to a public append-only data structure facilitating uses at least one key from a hot wallet of the digital wallet system. In embodiments, storing the digital form of the asset to a public append-only data structure facilitating uses at least one key from a cold wallet of the digital wallet system. In embodiments, the set of asset controls includes an asset control that matches an access control for an enterprise entity that submitted the asset to the digital wallet system. In embodiments, the set of asset controls includes an asset control that indicates a security clearance level for the asset. In embodiments, the set of asset controls transactional detail requirements for the asset. In embodiments, the digital wallet communicates with a digital twin of the digital asset. In embodiments, determining whether a transaction targeted for the marketplace with the monitored public market participant and involving the asset available in the digital wallet system satisfies an asset control criteria corresponding to the asset available is based on data of the digital asset provided by the digital twin. In embodiments, adapting the network path is based on one or more security characteristics of the digital asset. In embodiments, adapting the network path based on the one or more security characteristics of the digital asset includes configuring a path through the network pipeline that avoids poor reputation network resources. In embodiments, adapting the network path is based on one or more jurisdiction characteristics of the digital asset. In embodiments, adapting the network path based on the one or more jurisdiction characteristics of the digital asset includes configuring a path through the network pipeline that avoids network resources based on a jurisdiction of the network resources.

Enterprise Access Layer and Intelligent Data Layers

An intelligent data enterprise network access layer system includes: a computer-readable storage system that stores a network access layer configuration data store that maintains: ingestion parameters including one or more data structures that represent aspects of one or more of a plurality of data sources including a source location, an interface protocol, a source data ontology, and an ingestion cost; parsing rules that facilitate determining one or more of structure, content, relationships among data elements, intended meaning of the data elements, or relationships of data, structure, and intended meaning; and one or more analysis algorithms; and a set of one or more processors of the network access layer that is controlled by an enterprise, the set of one or more processors that execute a set of computer-readable instructions, where the set of one or more processors collectively: monitor a plurality of public market participants via an interface system of the network access layer; receive an indication that a monitored public market participant requests a digital asset candidate; determine at least one digital wallet system associated with the network access layer with available assets based on the received request; configure an ingestion system based on the ingestion parameters and parsing rules in the network access layer configuration data store for the at least one digital wallet; configure an analysis system based on the analysis algorithms in the network access layer configuration data store for the at least one digital wallet; configure an intelligence deriving system based on information in the digital asset candidate request and available intelligence services in an intelligence service system associated with the network access layer; ingest data from the at least one digital wallet pertaining to available assets using the ingestion system; analyze the ingested data from the at least one digital wallet using the analysis system; derive a set of intelligence data from at least one of the ingested data from the at least one data source or an outcome of using the analysis system; determine based on the derived set of intelligence data and the request whether the digital asset candidate matches an available asset; identify a set of asset controls managed by a permission system of the network access layer, where the permission system is configured to assign the set of asset controls to exchangeable enterprise digital assets in the digital wallet system; determine whether a transaction with the monitored public market participant that involves a matching available asset satisfies a criteria of the set of asset controls assigned to the matching available asset, where the criteria indicates that a threshold number of the set of asset controls have been violated; and in response to determining that the transaction with the monitored public market participant that involves the matching available asset satisfies the assigned asset control criteria, generate a message data packet requesting an actual transaction with the monitored public market participant involving the asset available, the message including a portion of the set of intelligence data, where the message data packet is configured for communication via the interface system.

In embodiments, the computer-readable storage system stores an intelligent data layer store that maintains results of operations of one or more systems of the intelligent data enterprise network access layer system. In embodiments, the one or more systems includes the ingestion system, the analysis system, the permissions system, the interface system, and the intelligence deriving system. In embodiments, the result of operations includes intermediate results of at least one of the one or more systems and at least one role-adapted final result variant of the intermediate results. In embodiments, to configure the analysis system is further based on public market participants objectives of the request. In embodiments, re to configure the analysis system is further based on aspects of the request for a digital asset candidate. In embodiments, the set of one or more processors is configured in an intelligent data enterprise network access layer control tower that configures and operates the intelligent data enterprise network access layer system by communicating control sequences with the ingestion system, the analysis system, the permission system, the interface system, and the intelligence deriving system. Some embodiments include an algorithm portal of an intelligent data enterprise network access layer control tower of the system through which at least one of the analysis algorithms is received. In embodiments, the ingestion system parses content of digital wallets to determine structure of the content and relationships among elements in the data. In embodiments, the matching asset is available in a hot wallet of the digital wallet system. In embodiments, the matching asset is available in a cold wallet of the digital wallet system. In embodiments, matching asset is available in a custodial wallet of the digital wallet system.

Some embodiments include: receiving a response message from the monitored public market participant; and determining that the response message indicates an acknowledgement to fulfill the request for the actual transaction; and facilitating fulfillment of the actual transaction. In embodiments, facilitating fulfillment of the actual transaction includes storing a digital form of the asset in a public append-only data structure to represent execution of the actual transaction. In embodiments, facilitating fulfillment of the asset request includes: signing the actual transaction involving the asset on a cold wallet; and relaying the signed transaction using a hot wallet of the digital wallet system that is associated with the cold wallet. In embodiments, storing the digital form of the asset to a public append-only data structure facilitates use of at least one key from a hot wallet of the digital wallet system. In embodiments, storing the digital form of the asset to a public append-only data structure facilitates use of at least one key from a cold wallet of the digital wallet system. In embodiments, the set of asset controls includes an asset control that matches an access control for an enterprise entity that submitted the asset to the digital wallet system. In embodiments, the set of asset controls includes an asset control that indicates a security clearance level for the asset. In embodiments, the set of asset controls transactional detail requirements for the asset.

Cross-Market Transactions with Enterprise Access Layers

A computer-implemented method includes: monitoring a plurality of public market participants in a plurality of markets via an interface system of a network access layer, where the network access layer is controlled by an enterprise and corresponds to an intelligence system that hosts exchangeable enterprise digital assets; receiving, at the network access layer via the interface system, market data from a plurality of data source feeds, each of the data source feeds corresponding to one or more of the plurality of markets, the market data including an indication that a monitored public market participant requests a digital asset candidate; processing the market data by performing one or more of filtering, normalizing, deduplicating, organizing, summarizing, and compressing, the market data; creating a distributed ledger, the distributed ledger being based on a blockchain; storing the processed data via the distributed ledger, the processed data being stored via one or more blocks of the distributed ledger; determining, by the intelligence system of the network access layer, whether the digital asset candidate matches an asset available in a digital wallet system associated with the network access layer; and in response to the digital asset candidate matching the asset available in the digital wallet system: identifying a set of asset controls managed by a permission system of the network access layer, where the permission system is configured to assign the set of asset controls to exchangeable enterprise digital assets in the digital wallet system; determining whether a prospective transaction with the monitored public market participant that involves the asset available in the digital wallet system satisfies an asset control criteria corresponding to the asset available, the prospective transaction determined via a machine learned model, where the asset control criteria is configured in a smart contract, the smart contract having triggering conditions based on a threshold number of the set of asset control criteria of the prospective transaction have been violated and storing the smart contract via the distributed ledger, the smart contract being stored via one or more blocks of the distributed ledger; and in response to the smart contract determining that the prospective transaction with the monitored public market participant that involves the asset available in the digital wallet system satisfies the asset control criteria, generating a message data packet requesting an actual transaction with the set of asset control criteria of the prospective transaction with the monitored public market participant involving the asset available, where the message data packet is configured for communication via the interface system.

A computer-implemented method includes: monitoring a plurality of public market participants in a plurality of markets via an interface system of a network access layer, where the network access layer is controlled by an enterprise and corresponds to an intelligence system that hosts exchangeable enterprise digital assets; receiving, at the network access layer via the interface system, market data from the plurality of markets, the market data including an indication that a monitored public market participant requests a digital asset candidate; determining, by the intelligence system of the network access layer, whether the digital asset candidate matches an asset available in a digital wallet system associated with the network access layer; and in response to the digital asset candidate matching the asset available in the digital wallet system: identifying a set of asset controls managed by a permission system of the network access layer, where the permission system is configured to assign the set of asset controls to exchangeable enterprise digital assets in the digital wallet system; determining whether a prospective transaction with the monitored public market participant that involves the asset available in the digital wallet system satisfies an asset control criteria corresponding to the asset available, the prospective transaction determined via a machine learned model, where the asset control criteria is configured in a smart contract, the smart contract having triggering conditions based on a threshold number of the set of asset control criteria of the prospective transaction have been violated and storing the smart contract via a distributed ledger being based on a blockchain, the smart contract being stored via one or more blocks of the distributed ledger; and in response to the smart contract determining that the prospective transaction with the monitored public market participant that involves the asset available in the digital wallet system satisfies the asset control criteria, generating a message data packet requesting an actual transaction that includes the set of asset control criteria of the prospective transaction with the monitored public market participant involving the asset available, where the message data packet is configured for communication via the interface system.

In embodiments, the asset is available in a hot wallet of the digital wallet system. In embodiments, the asset is available in a cold wallet of the digital wallet system. In embodiments, the asset is available in a custodial wallet of the digital wallet system. Some embodiments include: receiving a response message from the monitored public market participant; determining that the response message indicates an acknowledgement to fulfill the request for the actual transaction; and facilitating fulfillment of the actual transaction according to the set of asset control criteria of the prospective transaction configured into the smart contract. In embodiments, facilitating fulfillment of the actual transaction includes storing a digital form of the asset in a public append-only data structure to represent execution of the actual transaction, where the public append-only data structure is the distributed ledger, and storing a digital form of the asset includes being stored via one or more blocks of the distributed ledger. In embodiments, facilitating fulfillment of the asset transaction request includes: signing the actual transaction involving the asset on a cold wallet; and relaying the signed transaction using a hot wallet of the digital wallet system that is associated with the cold wallet. In embodiments, storing the digital form of the asset to a public append-only data structure facilitates using at least one key from a hot wallet of the digital wallet system. In embodiments, storing the digital form of the asset to a public append-only data structure facilitates using at least one key from a cold wallet of the digital wallet system. In embodiments, the set of asset controls includes an asset control that matches an access control for an enterprise entity that submitted the asset to the digital wallet system. In embodiments, the set of asset controls includes an asset control that indicates a security clearance level for the asset. In embodiments, the set of asset controls define transactional detail requirements for the asset that are configured into the smart contract.

In embodiments, a system includes: a network access layer including a processor and storage hardware in communication with the processor, where the storage hardware includes instructions that when executed by the processor perform operations, and where the operations include: monitoring a plurality of public market participants in a plurality of markets via an interface system of a network access layer, where the network access layer is controlled by an enterprise and corresponds to an intelligence system that hosts exchangeable enterprise digital assets; receiving, at the network access layer via the interface system, market data from the plurality of markets, the market data including an indication that a monitored public market participant requests a digital asset candidate; and determining, by the intelligence system of the network access layer, whether the digital asset candidate matches an asset available in a digital wallet system associated with the network access layer; and in response to the digital asset candidate matching the asset available in the digital wallet system: identifying a set of asset controls managed by a permission system of the network access layer, where the permission system is configured to assign the set of asset controls to exchangeable enterprise digital assets in the digital wallet system; determining whether a prospective transaction with the monitored public market participant that involves the asset available in the digital wallet system satisfies an asset control criteria corresponding to the asset available, the prospective transaction determined via a machine learned model, where the asset control criteria is configured in a smart contract, the smart contract having triggering conditions based on a threshold number of the set of asset control criteria of the prospective transaction have been violated and storing the smart contract via a distributed ledger being based on a blockchain, the smart contract being stored via one or more blocks of the distributed ledger; and in response to the smart contract determining that the prospective transaction with the monitored public market participant that involves the asset available in the digital wallet system satisfies the asset control criteria, generating a message data packet requesting an actual transaction that includes the set of asset control criteria of the prospective transaction with the monitored public market participant involving the asset available, where the message data packet is configured for communication via the interface system.

In embodiments, the asset is available in a hot wallet of the digital wallet system. In embodiments, the asset is available in a cold wallet of the digital wallet system. In embodiments, the asset is available in a custodial wallet of the digital wallet system. In embodiments, the operations further comprise: receiving a response message from the monitored public market participant; determining that the response message indicates an acknowledgement to fulfill the request for the actual transaction; and facilitating fulfillment of the actual transaction according to the set of asset control criteria of the prospective transaction configured into the smart contract.

In embodiments, facilitating fulfillment of the actual transaction includes storing a digital form of the asset in a public append-only data structure to represent execution of the actual transaction, where the public append-only data structure is the distributed ledger, and storing a digital form of the asset includes being stored via one or more blocks of the distributed ledger. In embodiments, facilitating fulfillment of the asset request includes: signing the actual transaction involving the asset on a cold wallet; and relaying the signed transaction using a hot wallet of the digital wallet system that is associated with the cold wallet. In embodiments, storing the digital form of the asset to a public append-only data structure facilitates using at least one key from a hot wallet of the digital wallet system. In embodiments, storing the digital form of the asset to a public append-only data structure facilitating using at least one key from a cold wallet of the digital wallet system. In embodiments, the set of asset controls includes an asset control that matches an access control for an enterprise entity that submitted the asset to the digital wallet system. In embodiments, the set of asset controls includes an asset control that indicates a security clearance level for the asset. In embodiments, the set of asset controls defines transactional detail requirements for the asset that are configured into the smart contract.

Trust and Transactions Summary

In embodiments, a method includes identifying, by a device, an opportunity to engage in a transaction associated with a blockchain address of a blockchain ledger; receiving, by the device and from another device that is a member of a consensus trust network, a consensus trust score that is associated with the blockchain address; determining, by the device, whether to engage in the transaction with the blockchain address, wherein the determining is based on the consensus trust score received from the consensus trust network; and performing, by the device, an action to initiate an engagement in the transaction in response to determining to engage in the transaction with the blockchain address based on the consensus trust score.

In embodiments, a method includes receiving, by a device, information that associates a blockchain address with fraudulent activity, wherein the blockchain address is associated with a blockchain ledger; generating, by the device, a first trust score for the blockchain address, wherein the local node trust score is based on the information; receiving, by the device and from at least two other devices, at least two additional trust scores for the blockchain address; determining, by the device, a consensus trust score based on the first trust score and the at least two additional trust scores; and generating, by the device, a blockchain entry on the blockchain ledger, a blockchain entry that associates the consensus trust score with the blockchain address. In some embodiments, the device and the at least two other devices are members of a trust network of devices that determine consensus trust scores for blockchain addresses of the blockchain ledger. In some embodiments, the device is configured to generate the blockchain entry on the blockchain ledger in response to a request on the blockchain ledger for a trust evaluation of the blockchain address. In some embodiments, the device is configured to generate the blockchain entry on the blockchain ledger in response to an activity of the blockchain address on the blockchain ledger. In some embodiments, the device is configured to generate the blockchain entry on the blockchain ledger in response to a transaction on the blockchain ledger, wherein the transaction is associated with the blockchain address. In some embodiments, the device is further configured to monitor the blockchain ledger to detect transaction with the blockchain address. In some embodiments, the blockchain entry includes a blockchain report that provides a basis for the consensus trust rating. Some embodiments further include generating, on the blockchain ledger, a fraud entry associated with the blockchain address, wherein the fraud entry is based on a change of a consensus trust rating associated with the blockchain address. In some embodiments, the consensus trust score is based on a first reputation score associated with the device and additional reputation scores associated with each of the at least two other devices. In some embodiments, determining the consensus trust score further includes weighting the trust score generated by and/or received from a respective device, wherein the weighting is based on the reputation score associated with the respective device. In some embodiments, the reputation score associated with a respective device is based on an amount of work performed by the respective device in generating trust scores for blockchain addresses of the blockchain ledger. In some embodiments, determining the consensus trust score further includes excluding, from the determining of the consensus trust score, an outlier trust score that is statistically inconsistent with other trust scores included in the determining of the consensus trust score. In some embodiments, determining the consensus trust score includes determining that an average variance of the trust scores included in the determining of the consensus trust score is within a threshold variance.

In embodiments, a method includes receiving, by a device, a request to generate a trust score for a blockchain address associated with a blockchain ledger; determining, by the device, information that associates the blockchain address with fraudulent activity; generating, by the device, a first trust score for the blockchain address, wherein the local node trust score is based on the information; transmitting, by the device, the first trust score associated with the blockchain address to another device; receiving, by the device and from another device, a consensus trust score for the blockchain address, wherein the consensus trust score is based on the first trust score and at least two additional trust scores associated with the blockchain address; and generating, by the device, a blockchain entry on the blockchain ledger, a blockchain entry that associates the consensus trust score with the blockchain address. In some embodiments, the device and the other device are members of a trust network of devices that determine consensus trust scores for blockchain addresses of the blockchain ledger. In some embodiments, the device is configured to generate the blockchain entry on the blockchain ledger in response to a request on the blockchain ledger for a trust evaluation of the blockchain address. In some embodiments, the device is configured to generate the blockchain entry on the blockchain ledger in response to an activity of the blockchain address on the blockchain ledger. In some embodiments, the device is configured to generate the blockchain entry on the blockchain ledger in response to a transaction on the blockchain ledger, wherein the transaction is associated with the blockchain address. In some embodiments, the device is further configured to monitor the blockchain ledger to detect transaction with the blockchain address. In some embodiments, the blockchain entry includes a blockchain report that provides a basis for the consensus trust rating. Some embodiments further include generating, on the blockchain ledger, a fraud entry associated with the blockchain address, wherein the fraud entry is based on a change of a consensus trust rating associated with the blockchain address. In some embodiments, the consensus trust score is based on a first reputation score associated with the device and an additional reputation score associated with the other device. In some embodiments, determining the consensus trust score includes weighting the trust score generated by and/or received from a respective device, wherein the weighting is based on the reputation score associated with the respective device. In some embodiments, the reputation score associated with a respective device is based on an amount of work performed by the respective device in generating trust scores for blockchain addresses of the blockchain ledger. In some embodiments, determining the consensus trust score includes excluding, from the determining of the consensus trust score, an outlier trust score that is statistically inconsistent with other trust scores included in the determining of the consensus trust score. In some embodiments, determining the consensus trust score includes determining that an average variance of the trust scores included in the determining of the consensus trust score is within a threshold variance.

In embodiments, a method includes receiving, by a device, information that associates a blockchain address with fraudulent activity, wherein the blockchain address is associated with a blockchain ledger; processing, by the device, the information with a machine learning model, wherein the machine learning model is configured to generate trust scores based on information that associates blockchain addresses with fraudulent activity; receiving, by the device, an output of the machine learning model, wherein the output includes a first trust score for the blockchain address; receiving, by the device and from at least two other devices, at least two additional trust scores for the blockchain address; determining, by the device, a consensus trust score based on the first trust score and the at least two additional trust scores; and generating, by the device, a blockchain entry on the blockchain ledger, a blockchain entry that associates the consensus trust score with the blockchain address. In some embodiments, the device and the at least two other devices are members of a trust network of devices that determine consensus trust scores for blockchain addresses of the blockchain ledger. In some embodiments, the device is configured to generate the blockchain entry on the blockchain ledger in response to a request on the blockchain ledger for a trust evaluation of the blockchain address. In some embodiments, the device is configured to generate the blockchain entry on the blockchain ledger in response to an activity of the blockchain address on the blockchain ledger. In some embodiments, the device is configured to generate the blockchain entry on the blockchain ledger in response to a transaction on the blockchain ledger, wherein the transaction is associated with the blockchain address. In some embodiments, the device is further configured to monitor the blockchain ledger to detect transaction with the blockchain address. In some embodiments, the blockchain entry includes a blockchain report that provides a basis for the consensus trust rating. Some embodiments further include generating, on the blockchain ledger, a fraud entry associated with the blockchain address, wherein the fraud entry is based on a change of a consensus trust rating associated with the blockchain address. In some embodiments, the consensus trust score is based on a first reputation score associated with the device and additional reputation scores associated with each of the at least two other devices. In some embodiments, determining the consensus trust score includes weighting the trust score generated by and/or received from a respective device, wherein the weighting is based on the reputation score associated with the respective device. In some embodiments, the reputation score associated with a respective device is based on an amount of work performed by the respective device in generating trust scores for blockchain addresses of the blockchain ledger. In some embodiments, determining the consensus trust score includes excluding, from the determining of the consensus trust score, an outlier trust score that is statistically inconsistent with other trust scores included in the determining of the consensus trust score. In some embodiments, determining the consensus trust score includes determining that an average variance of the trust scores included in the determining of the consensus trust score is within a threshold variance.

In embodiments, a method includes receiving, by a device, information that associates a blockchain address with fraudulent activity, wherein the blockchain address is associated with a blockchain ledger; processing, by the device, the information with a quantum computing system, wherein the quantum computing system is configured to generate trust scores based on information that associates blockchain addresses with fraudulent activity; receiving, by the device, an output of the quantum computing system, wherein the output includes a first trust score for the blockchain address; receiving, by the device and from at least two other devices, at least two additional trust scores for the blockchain address; determining, by the device, a consensus trust score based on the first trust score and the at least two additional trust scores; and generating, by the device, a blockchain entry on the blockchain ledger, a blockchain entry that associates the consensus trust score with the blockchain address. In some embodiments, the device and the at least two other devices are members of a trust network of devices that determine consensus trust scores for blockchain addresses of the blockchain ledger. In some embodiments, the device is configured to generate the blockchain entry on the blockchain ledger in response to a request on the blockchain ledger for a trust evaluation of the blockchain address. In some embodiments, the device is configured to generate the blockchain entry on the blockchain ledger in response to an activity of the blockchain address on the blockchain ledger. In some embodiments, the device is configured to generate the blockchain entry on the blockchain ledger in response to a transaction on the blockchain ledger, wherein the transaction is associated with the blockchain address. In some embodiments, the device is further configured to monitor the blockchain ledger to detect transaction with the blockchain address. In some embodiments, the blockchain entry includes a blockchain report that provides a basis for the consensus trust rating. Some embodiments further include generating, on the blockchain ledger, a fraud entry associated with the blockchain address, wherein the fraud entry is based on a change of a consensus trust rating associated with the blockchain address. In some embodiments, the consensus trust score is based on a first reputation score associated with the device and additional reputation scores associated with each of the at least two other devices. In some embodiments, determining the consensus trust score includes weighting the trust score generated by and/or received from a respective device, wherein the weighting is based on the reputation score associated with the respective device. In some embodiments, the reputation score associated with a respective device is based on an amount of work performed by the respective device in generating trust scores for blockchain addresses of the blockchain ledger. In some embodiments, determining the consensus trust score includes excluding, from the determining of the consensus trust score, an outlier trust score that is statistically inconsistent with other trust scores included in the determining of the consensus trust score. In some embodiments, determining the consensus trust score includes determining that an average variance of the trust scores included in the determining of the consensus trust score is within a threshold variance. In some embodiments, the quantum computing system is configured to generate trust scores based on a graph clustering analysis of activities associated with the blockchain ledger, wherein the graph clustering analysis includes the blockchain address. In some embodiments, the quantum computing system is further configured to detect a market trend associated with an asset, and the quantum prediction algorithm is configured to generate trust scores for respective blockchain addresses based on an activity of the respective blockchain address that is associated with the asset. In some embodiments, the quantum computing system is further configured to generate trust scores based on a quantum principal component analysis of the information associated with the blockchain addresses.

In embodiments, a method includes receiving, by a device, information that associates a blockchain address with fraudulent activity, wherein the blockchain address is associated with a blockchain ledger; generating, by the device, a digital twin of an entity associated with the blockchain address, wherein a response of the digital twin to a stimulus corresponds to a predicted response of the entity to the stimulus; generating, by the device, a first trust score for the blockchain address, wherein the local node trust score is based on an analysis of the digital twin; receiving, by the device and from at least two other devices, at least two additional trust scores for the blockchain address; determining, by the device, a consensus trust score based on the first trust score and the at least two additional trust scores; and generating, by the device, a blockchain entry on the blockchain ledger, a blockchain entry that associates the consensus trust score with the blockchain address. In some embodiments, the device and the at least two other devices are members of a trust network of devices that determine consensus trust scores for blockchain addresses of the blockchain ledger. In some embodiments, the device is configured to generate the blockchain entry on the blockchain ledger in response to a request on the blockchain ledger for a trust evaluation of the blockchain address. In some embodiments, the request is associated with a transaction that includes the blockchain address, and the device is configured to determine the first trust score based on a simulation of the transaction including the digital twin and a behavior of the digital twin during the simulation. In some embodiments, the device is configured to generate the blockchain entry on the blockchain ledger in response to an activity of the blockchain address on the blockchain ledger. In some embodiments, the device is configured to generate the blockchain entry on the blockchain ledger in response to a transaction on the blockchain ledger, wherein the transaction is associated with the blockchain address. In some embodiments, the device is further configured to monitor the blockchain ledger to detect transaction with the blockchain address. In some embodiments, the blockchain entry includes a blockchain report that provides a basis for the consensus trust rating. Some embodiments further include generating, on the blockchain ledger, a fraud entry associated with the blockchain address, wherein the fraud entry is based on a change of a consensus trust rating associated with the blockchain address. In some embodiments, the consensus trust score is based on a first reputation score associated with the device and additional reputation scores associated with each of the at least two other devices. In some embodiments, determining the consensus trust score includes weighting the trust score generated by and/or received from a respective device, wherein the weighting is based on the reputation score associated with the respective device. In some embodiments, the reputation score associated with a respective device is based on an amount of work performed by the respective device in generating trust scores for blockchain addresses of the blockchain ledger. In some embodiments, determining the consensus trust score includes excluding, from the determining of the consensus trust score, an outlier trust score that is statistically inconsistent with other trust scores included in the determining of the consensus trust score. In some embodiments, determining the consensus trust score includes determining that an average variance of the trust scores included in the determining of the consensus trust score is within a threshold variance.

In embodiments, a method includes receiving, by a device, information that associates a blockchain address with fraudulent activity, wherein the blockchain address is associated with a blockchain ledger; processing, by the device, the information with a dual purpose artificial neural network, wherein the dual purpose artificial neural network is configured to generate trust scores based on information that associates blockchain addresses with fraudulent activity; receiving, by the device, an output of the dual purpose artificial neural network, wherein the output includes a first trust score for the blockchain address; receiving, by the device and from at least two other devices, at least two additional trust scores for the blockchain address; determining, by the device, a consensus trust score based on the first trust score and the at least two additional trust scores; and generating, by the device, a blockchain entry on the blockchain ledger, a blockchain entry that associates the consensus trust score with the blockchain address. In some embodiments, the device and the at least two other devices are members of a trust network of devices that determine consensus trust scores for blockchain addresses of the blockchain ledger. In some embodiments, the device is configured to generate the blockchain entry on the blockchain ledger in response to a request on the blockchain ledger for a trust evaluation of the blockchain address. In some embodiments, the device is configured to generate the blockchain entry on the blockchain ledger in response to an activity of the blockchain address on the blockchain ledger. In some embodiments, the device is configured to generate the blockchain entry on the blockchain ledger in response to a transaction on the blockchain ledger, wherein the transaction is associated with the blockchain address. In some embodiments, the device is further configured to monitor the blockchain ledger to detect transaction with the blockchain address. In some embodiments, the blockchain entry includes a blockchain report that provides a basis for the consensus trust rating. Some embodiments further include generating, on the blockchain ledger, a fraud entry associated with the blockchain address, wherein the fraud entry is based on a change of a consensus trust rating associated with the blockchain address. In some embodiments, the consensus trust score is based on a first reputation score associated with the device and additional reputation scores associated with each of the at least two other devices. In some embodiments, determining the consensus trust score includes weighting the trust score generated by and/or received from a respective device, wherein the weighting is based on the reputation score associated with the respective device. In some embodiments, the reputation score associated with a respective device is based on an amount of work performed by the respective device in generating trust scores for blockchain addresses of the blockchain ledger. In some embodiments, determining the consensus trust score includes excluding, from the determining of the consensus trust score, an outlier trust score that is statistically inconsistent with other trust scores included in the determining of the consensus trust score. In some embodiments, determining the consensus trust score includes determining that an average variance of the trust scores included in the determining of the consensus trust score is within a threshold variance. Some embodiments further include updating, by the device, a data set that is associated with a training of the dual purpose artificial neural network; and retraining, by the device, the dual purpose artificial neural network based on the updated data set. In some embodiments, updating the data set includes adding, to the data set, one or more data samples based on a subsequent activity associated with the blockchain address.

In embodiments, a method includes receiving, by a device, information that associates a blockchain address with fraudulent activity, wherein the blockchain address is associated with a blockchain ledger; generating, by the device, a first trust score for the blockchain address, wherein the local node trust score is based on the information; receiving, by the device and from at least two other devices, at least two additional trust scores for the blockchain address; determining, by the device, a consensus trust score based on the first trust score and the at least two additional trust scores; and processing, by the device, one or more transactions associated with the blockchain address by a robotic process automation module, wherein the robotic process automation module is configured to engage in transactions with respective blockchain addresses associated with the blockchain ledger based on respective consensus trust scores associated with the respective blockchain addresses. In some embodiments, the device and the at least two other devices are members of a trust network of devices that determine consensus trust scores for blockchain addresses of the blockchain ledger. In some embodiments, the device is further configured to monitor the blockchain ledger to detect transaction with the blockchain address. In some embodiments, the blockchain entry includes a blockchain report that provides a basis for the consensus trust rating. Some embodiments further include generating, on the blockchain ledger, a fraud entry associated with the blockchain address, wherein the fraud entry is based on a change of a consensus trust rating associated with the blockchain address. In some embodiments, the consensus trust score is based on a first reputation score associated with the device and additional reputation scores associated with each of the at least two other devices. In some embodiments, determining the consensus trust score includes weighting the trust score generated by and/or received from a respective device, wherein the weighting is based on the reputation score associated with the respective device. In some embodiments, the reputation score associated with a respective device is based on an amount of work performed by the respective device in generating trust scores for blockchain addresses of the blockchain ledger. In some embodiments, determining the consensus trust score includes excluding, from the determining of the consensus trust score, an outlier trust score that is statistically inconsistent with other trust scores included in the determining of the consensus trust score. In some embodiments, determining the consensus trust score includes determining that an average variance of the trust scores included in the determining of the consensus trust score is within a threshold variance. In some embodiments, the robotic process automation module is further configured to determine whether or not to engage in transactions with respective blockchain addresses, and the determining is based on the respective consensus trust scores associated with the respective blockchain addresses. In some embodiments, the robotic process automation module is configured to engage in transactions with respective blockchain addresses associated with the blockchain ledger based on a training of the robotic process automation module, and the training is based on a training data set including data samples that correspond to actions taken by one or more users while engaging in transactions with blockchain addresses associated with the blockchain ledger. In some embodiments, the robotic process automation module is configured to determine whether or not to engage in transactions with respective blockchain addresses associated with the blockchain ledger based on a training of the robotic process automation module, and the training is based on a training data set including data samples that correspond to actions taken by one or more users while determining whether or not to engage in transactions with blockchain addresses associated with the blockchain ledger.

BRIEF DESCRIPTION OF THE FIGURES

The disclosure and the following detailed description of certain embodiments thereof may be understood by reference to the following figures:

FIG. 147 depicts a method for selecting an AI solution.

FIG. 148 depicts an AI solution selection and configuration system.

FIG. 149 depicts an AI solution selection and configuration system.

FIG. 150 depicts an AI solution selection and configuration system.

FIG. 151 depicts a component configuration circuit.

FIG. 152 depicts an AI solution selection and configuration system.

FIG. 153 depicts a system for selecting and configuring an artificial intelligence model.

FIG. 154 depicts a method of selecting and configuring an artificial intelligence model.

FIG. 155 is a schematic illustrating examples of architecture of a digital twin system according to embodiments of the present disclosure.

FIG. 156 is a schematic illustrating exemplary components of a digital twin management system according to embodiments of the present disclosure.

FIG. 157 is a schematic illustrating examples of a digital twin I/O system that interfaces with an environment, the digital twin system, and/or components thereof to provide bi-directional transfer of data between coupled components according to embodiments of the present disclosure.

FIG. 158 is a schematic illustrating an example set of identified states related to industrial environments that the digital twin system may identify and/or store for access by intelligent systems (e.g., a cognitive intelligence system) or users of the digital twin system according to embodiments of the present disclosure.

Figure 159:
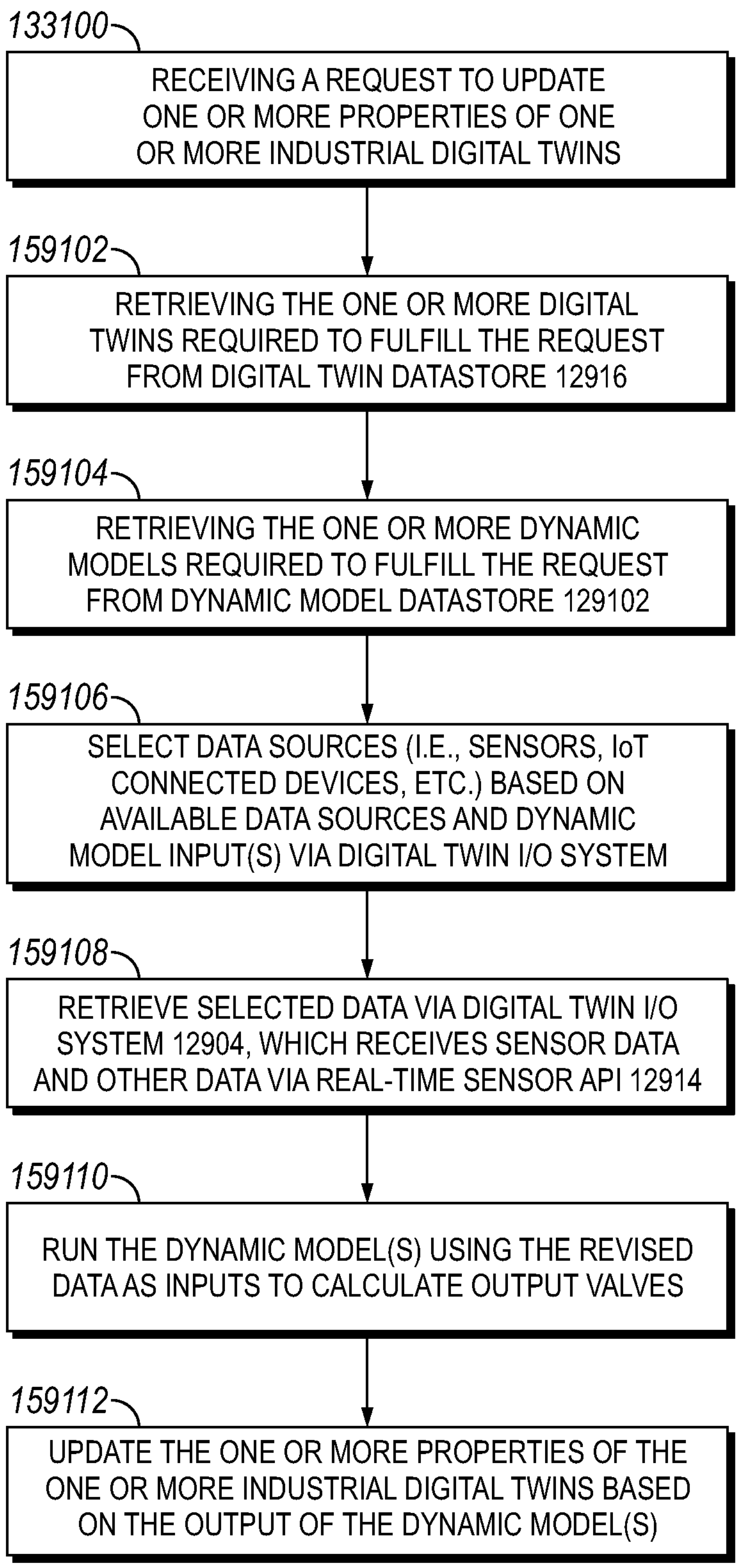

FIG. 159 is a schematic illustrating example embodiments of methods for updating a set of properties of a digital twin of the present disclosure on behalf of a client application and/or one or more embedded digital twins.

Figure 160:
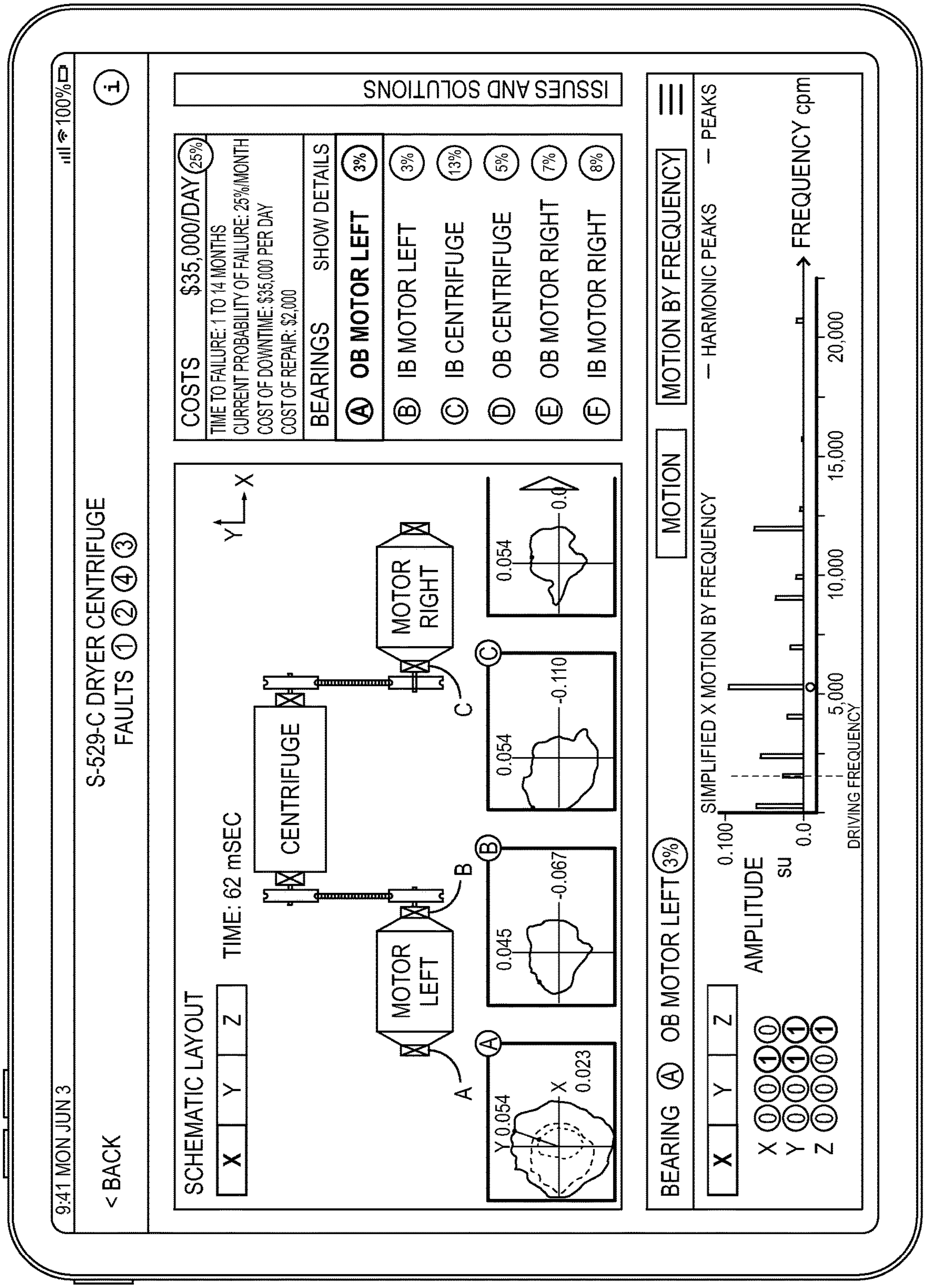

FIG. 160 illustrates example embodiments of a display interface of the present disclosure that renders a digital twin of a dryer centrifuge with information relating to the dryer centrifuge.

Figure 161:
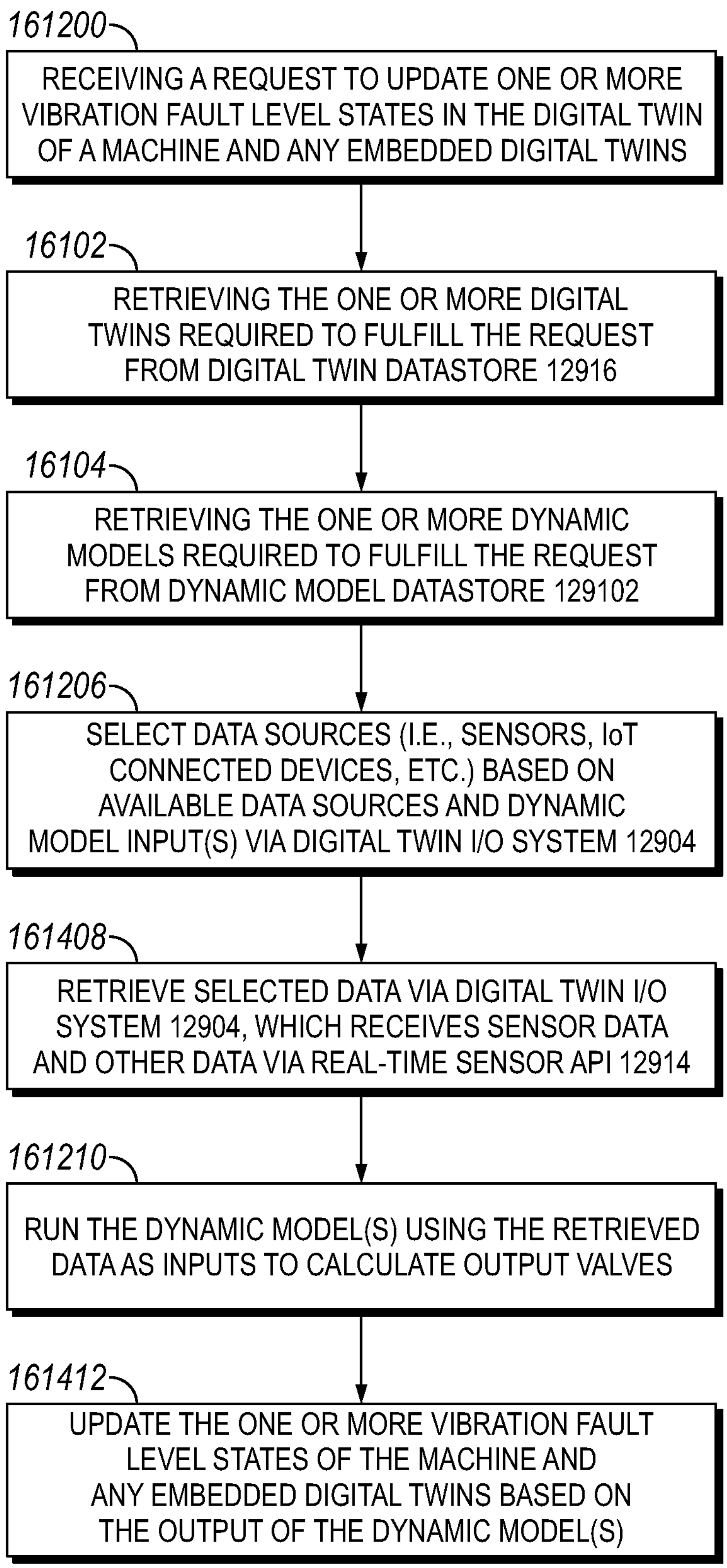

FIG. 161 is a schematic illustrating an example embodiment of a method for updating a set of vibration fault level states of machine components such as bearings in the digital twin of an industrial machine, on behalf of a client application.

Figure 162:
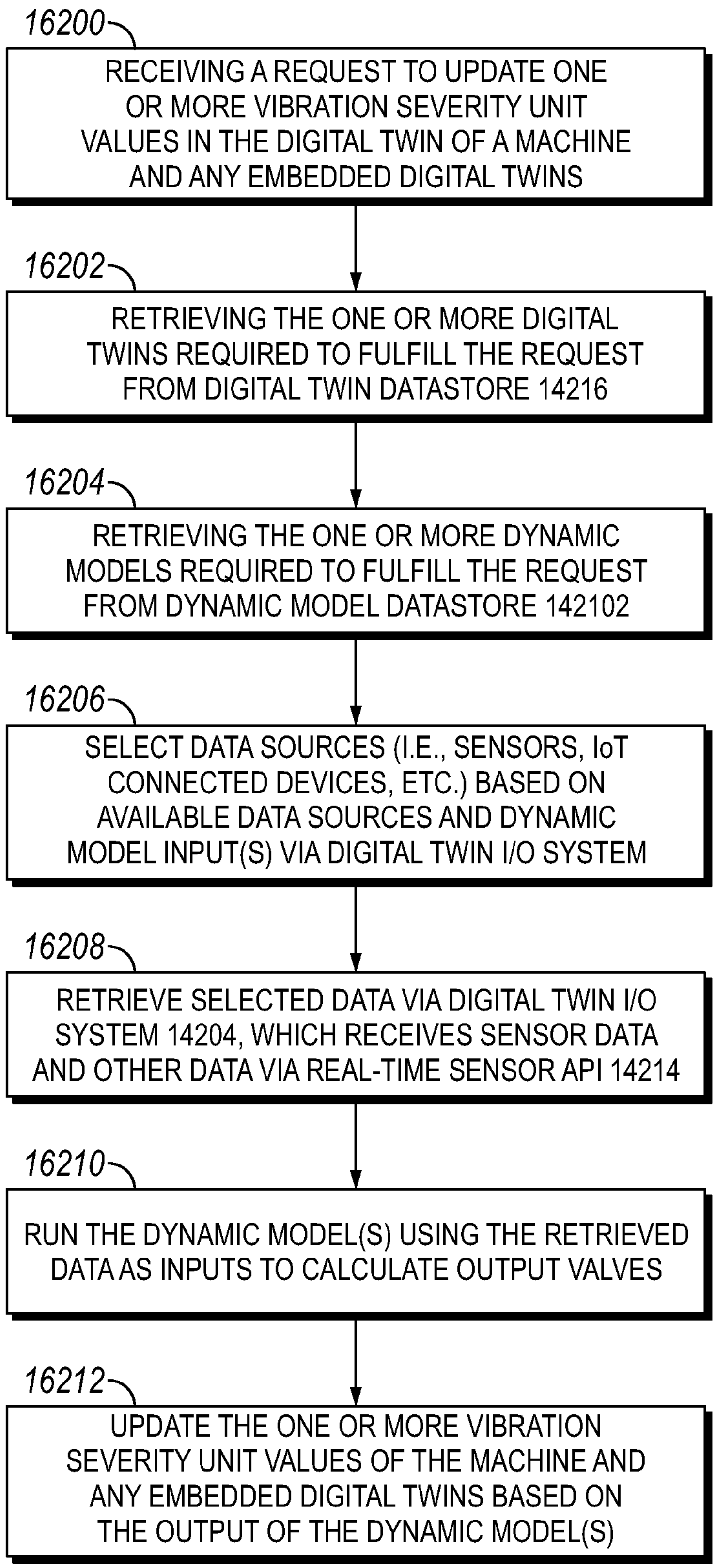

FIG. 162 is a schematic illustrating an example embodiment of a method for updating a set of vibration severity unit values of machine components such as bearings in the digital twin of a machine on behalf of a client application.

Figure 163:
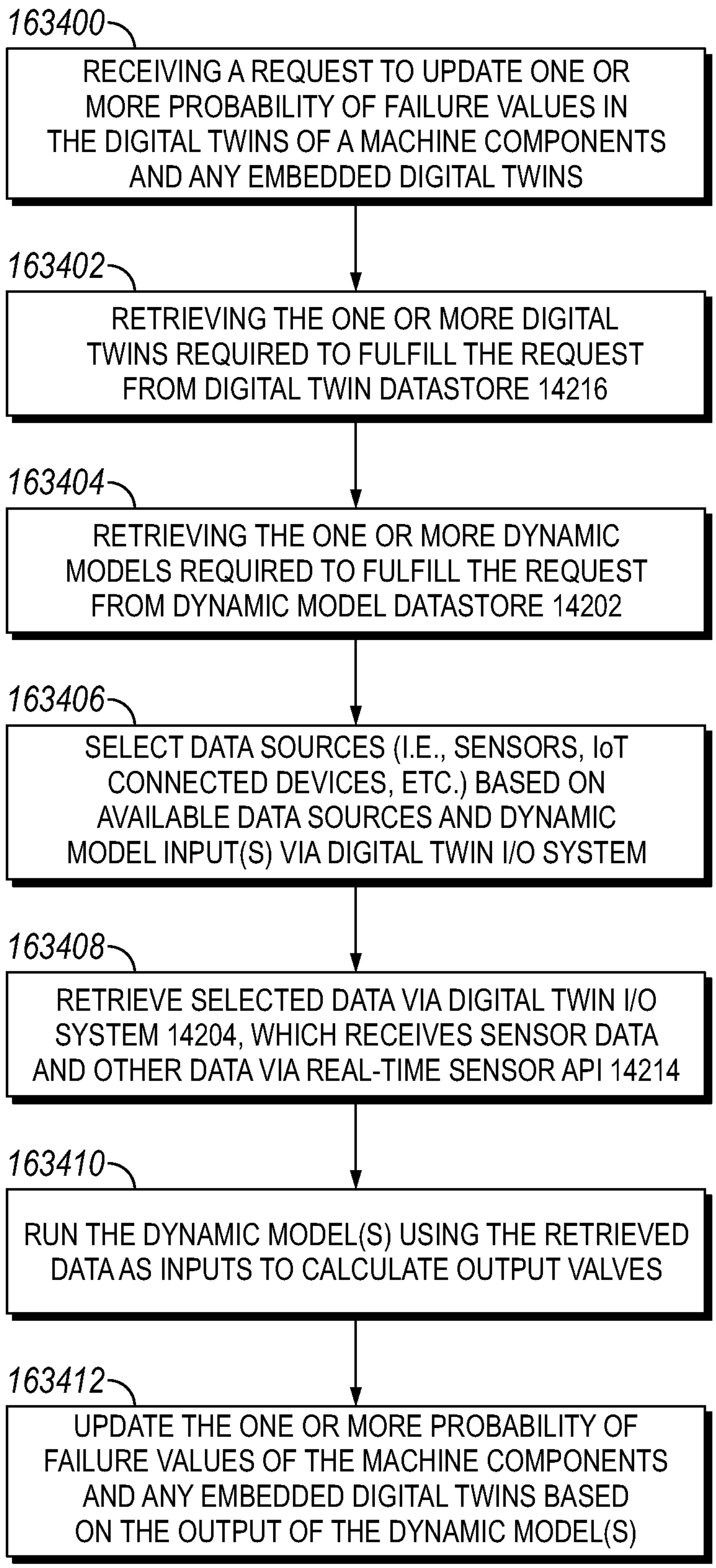

FIG. 163 is a schematic illustrating an example embodiment of a method for updating a set of probability of failure values in the digital twins of machine components on behalf of a client application.

Figure 164:
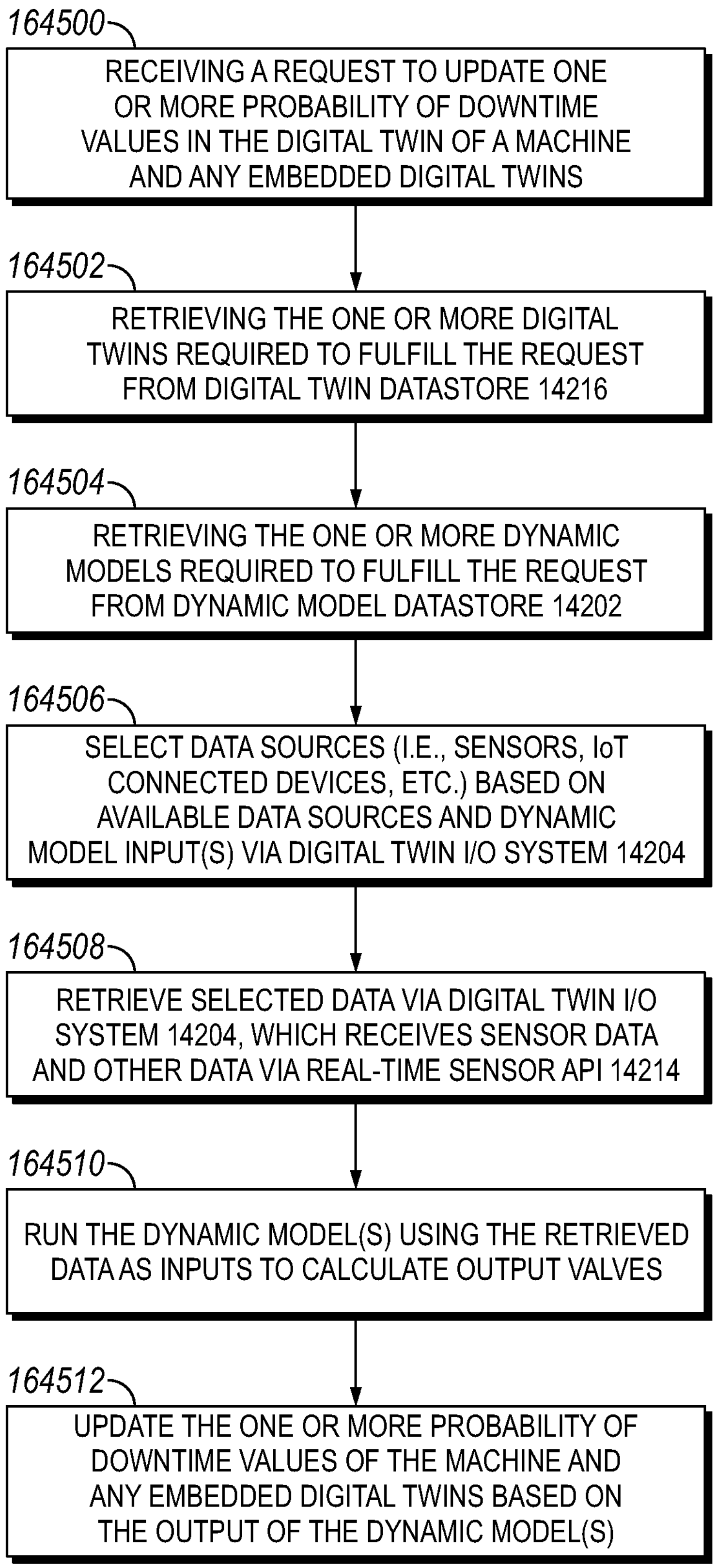

FIG. 164 is a schematic illustrating an example embodiment of a method for updating a set of probability of downtime values of machines in the digital twin of a manufacturing facility on behalf of a client application.

Figure 165:
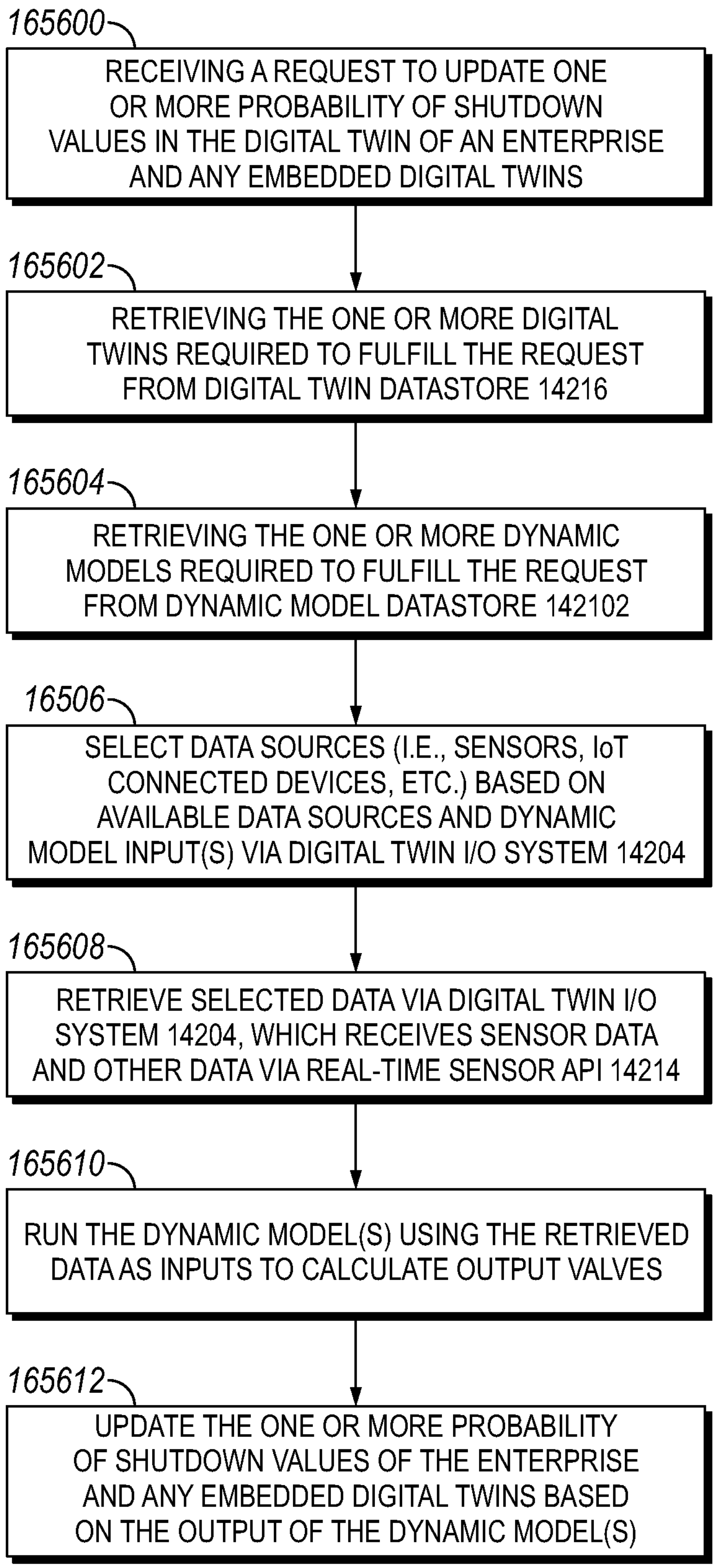

FIG. 165 is a schematic illustrating an example embodiment of a method for updating a set of probability of shutdown values of manufacturing facilities in the digital twin of an enterprise on behalf of a client application.

Figure 166:
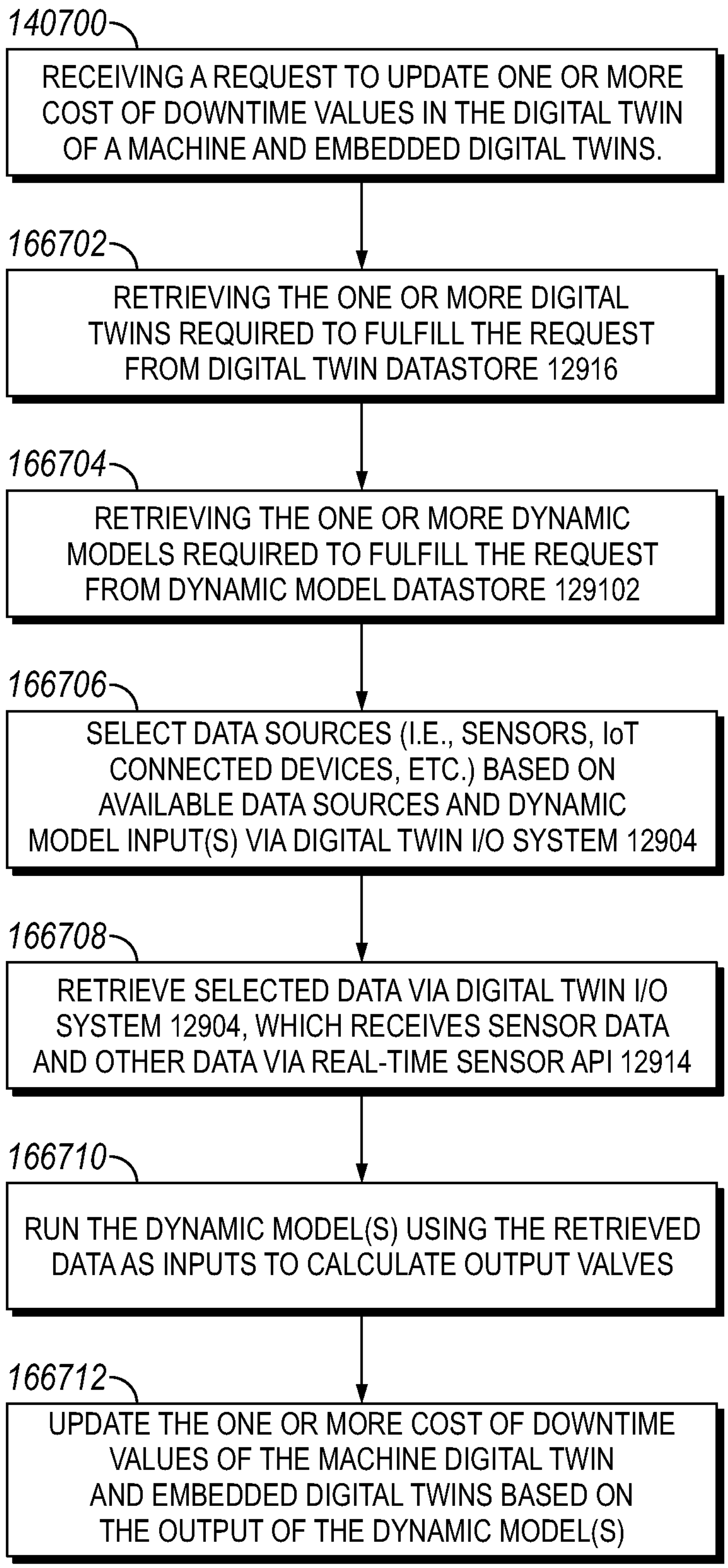

FIG. 166 is a schematic illustrating an example embodiment of a method for updating a set of cost of downtime values of machines in the digital twin of a manufacturing facility.

Figure 167:
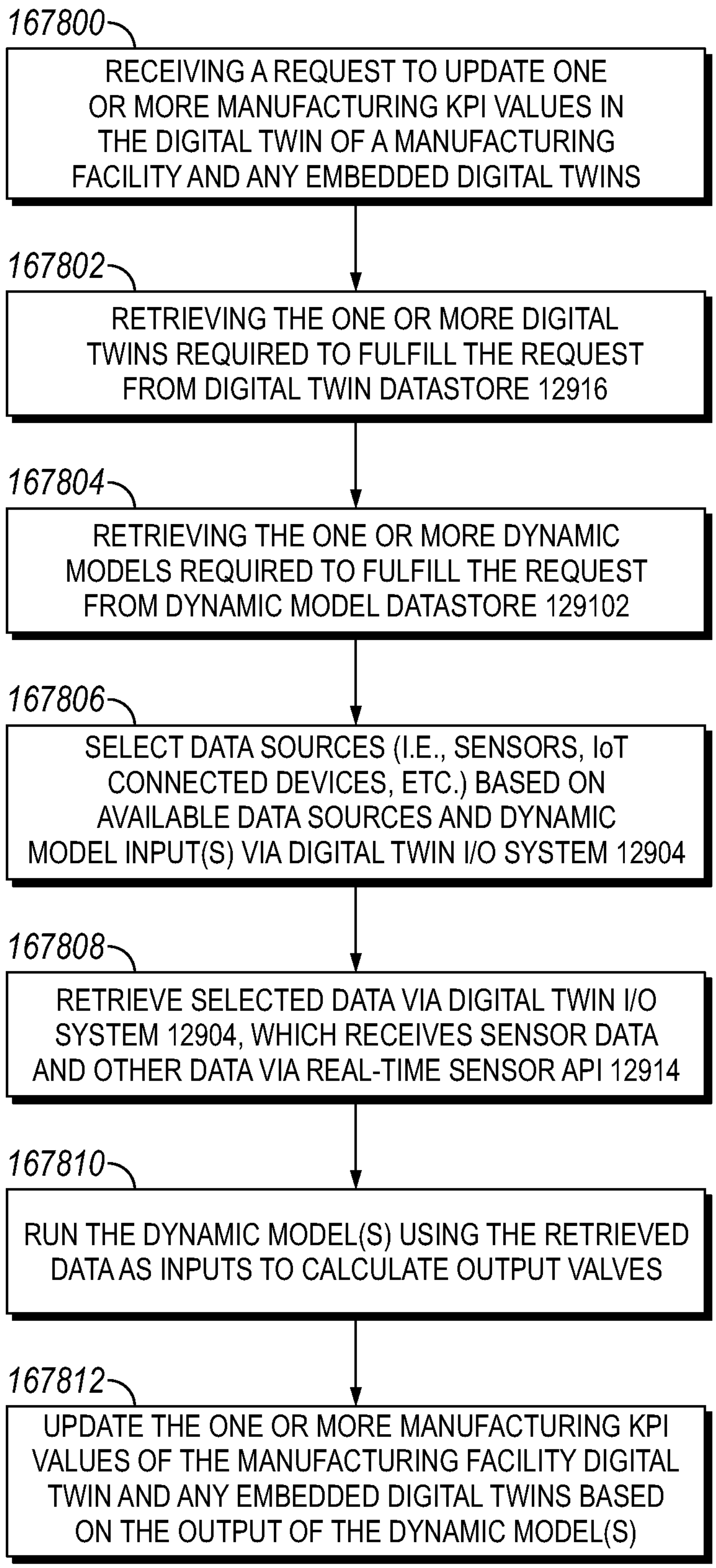

FIG. 167 is a schematic illustrating an example embodiment of a method for updating one or more manufacturing KPI values in a digital twin of a manufacturing facility, on behalf of a client application.

Figure 168:
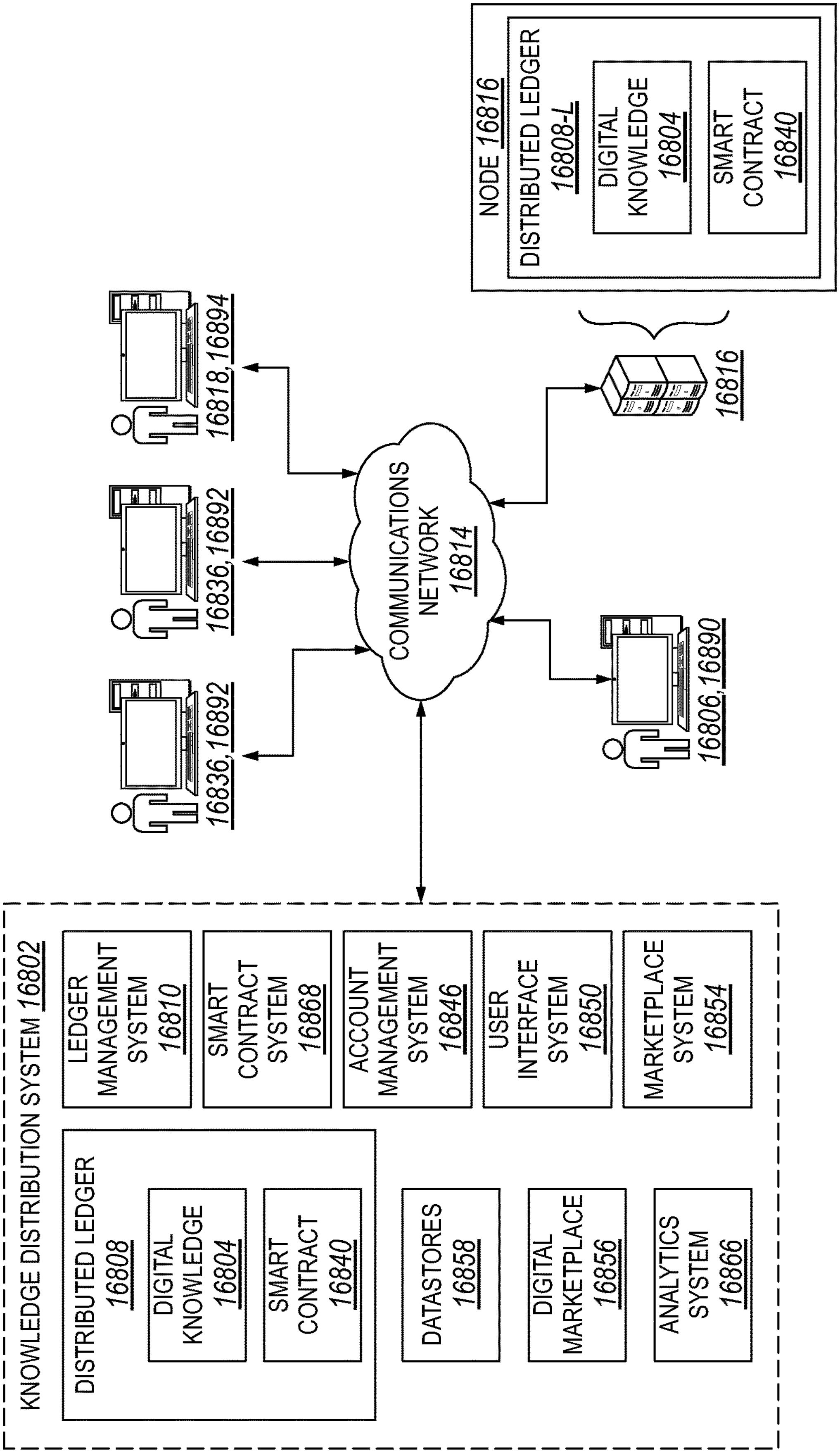

FIG. 168 is a schematic diagram of components of a knowledge distribution system and a communication network for facilitating management of digital knowledge in accordance with embodiments of the present disclosure.

Figure 169:
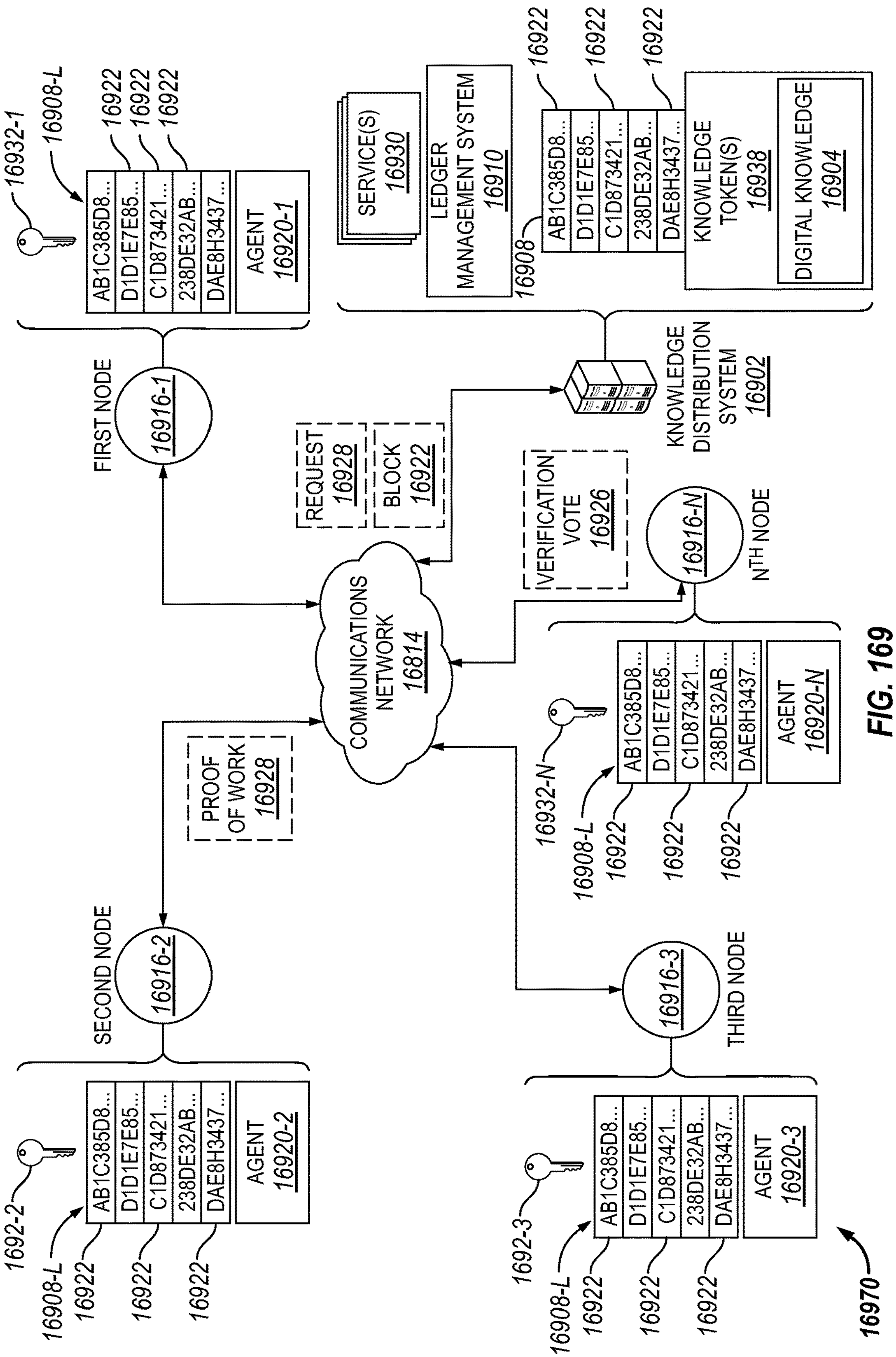

FIG. 169 is a schematic diagram of a ledger network of the knowledge distribution system in accordance with embodiments of the present disclosure.

Figure 170:
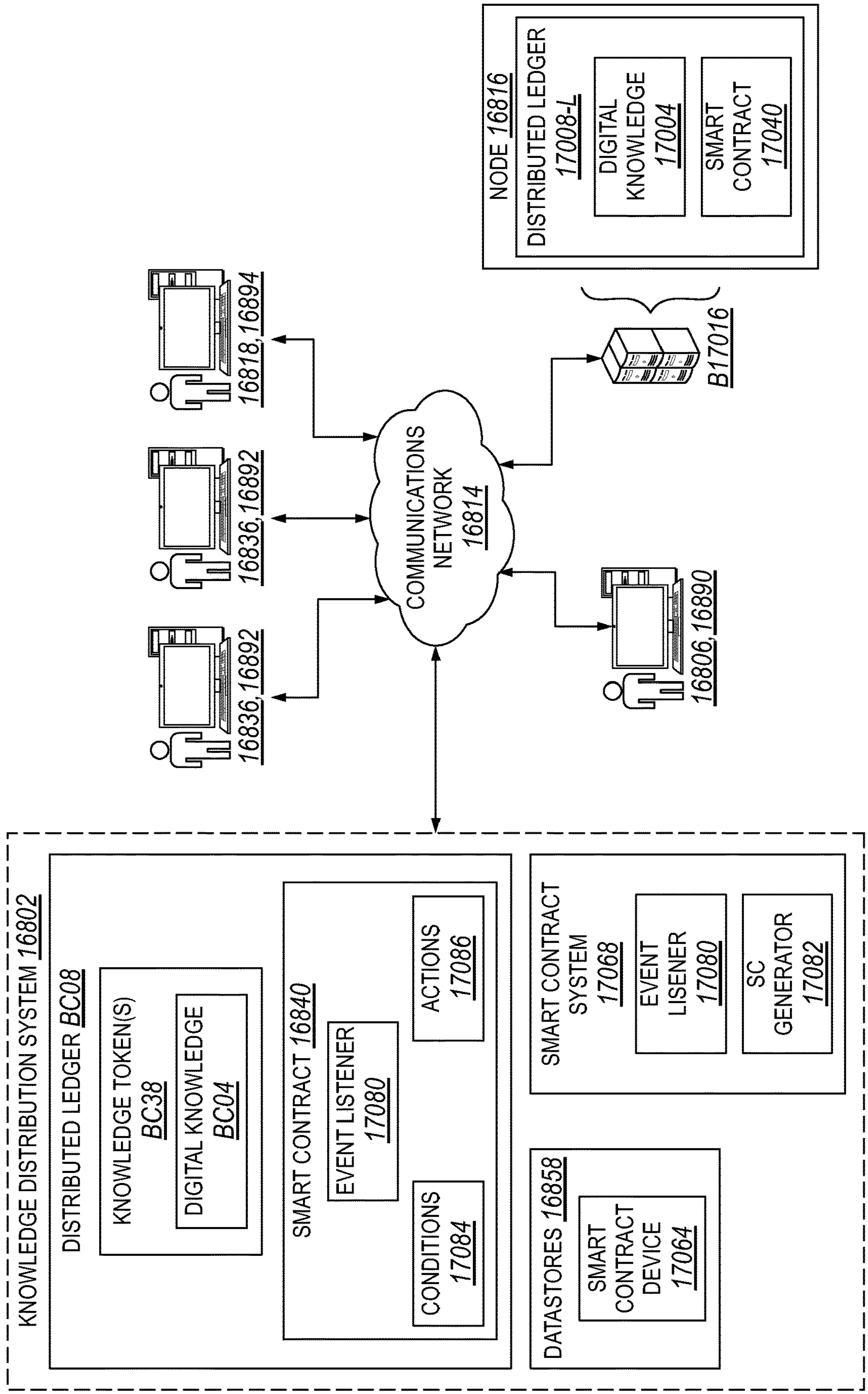

FIG. 170 is a schematic diagram of the knowledge distribution system of FIG. 168 including details of a smart contract and a smart contract system of the knowledge distribution system in accordance with embodiments of the present disclosure.

Figure 171:
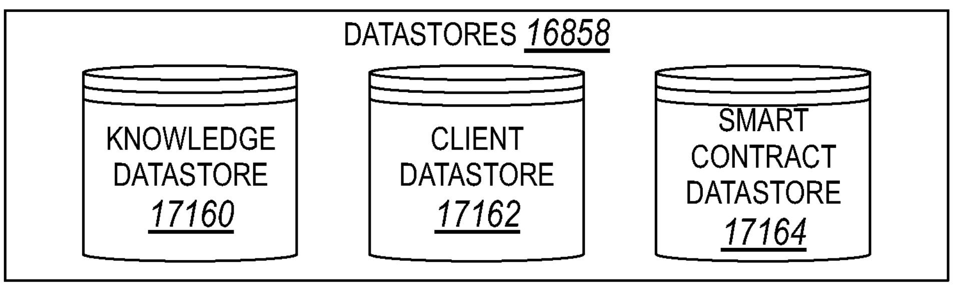

FIG. 171 is a schematic diagram of a plurality of datastores of the knowledge distribution system in accordance with embodiments of the present disclosure.

Figure 172:
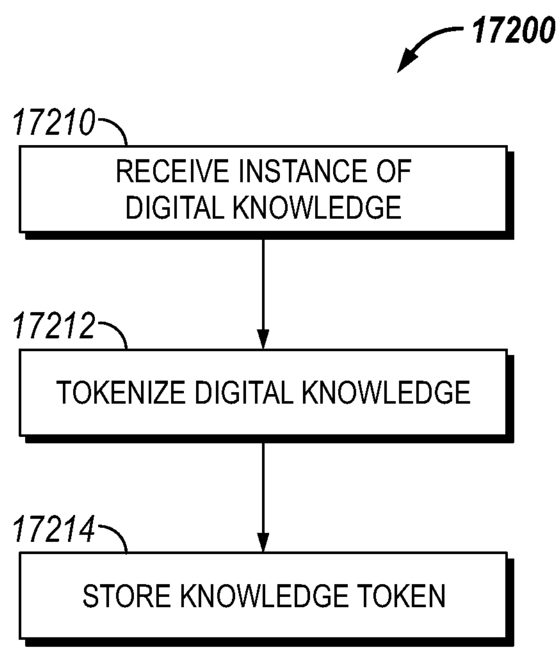

FIG. 172 illustrates a method of deploying a knowledge token and related smart contract via the knowledge distribution system in accordance with embodiments of the present disclosure.

Figure 173:
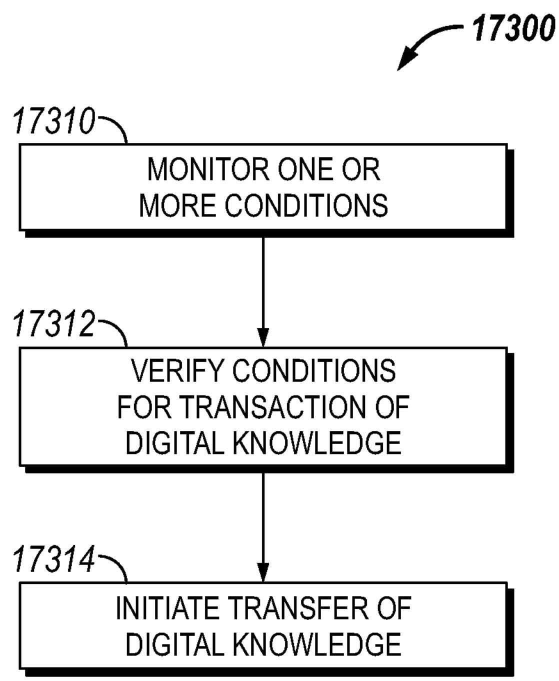

FIG. 173 illustrates a method of performing high level process flow of a smart contract that distributes digital knowledge via the knowledge distribution system in accordance with embodiments of the present disclosure.

Figure 174:
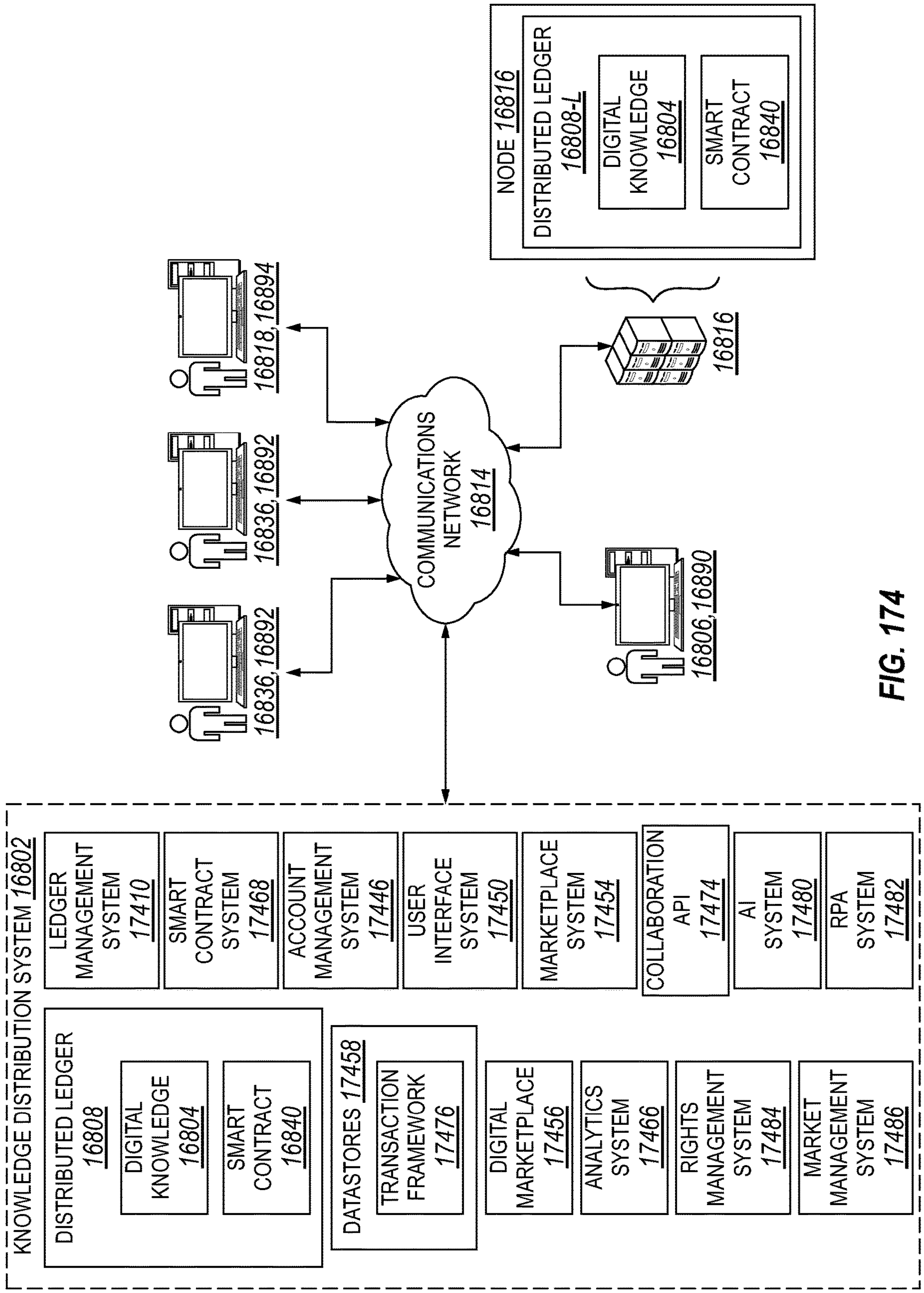

FIG. 174 is a schematic diagram of another embodiment of components of the knowledge distribution system and a communication network for facilitating management of digital knowledge in accordance with embodiments of the present disclosure.

Figure 175:
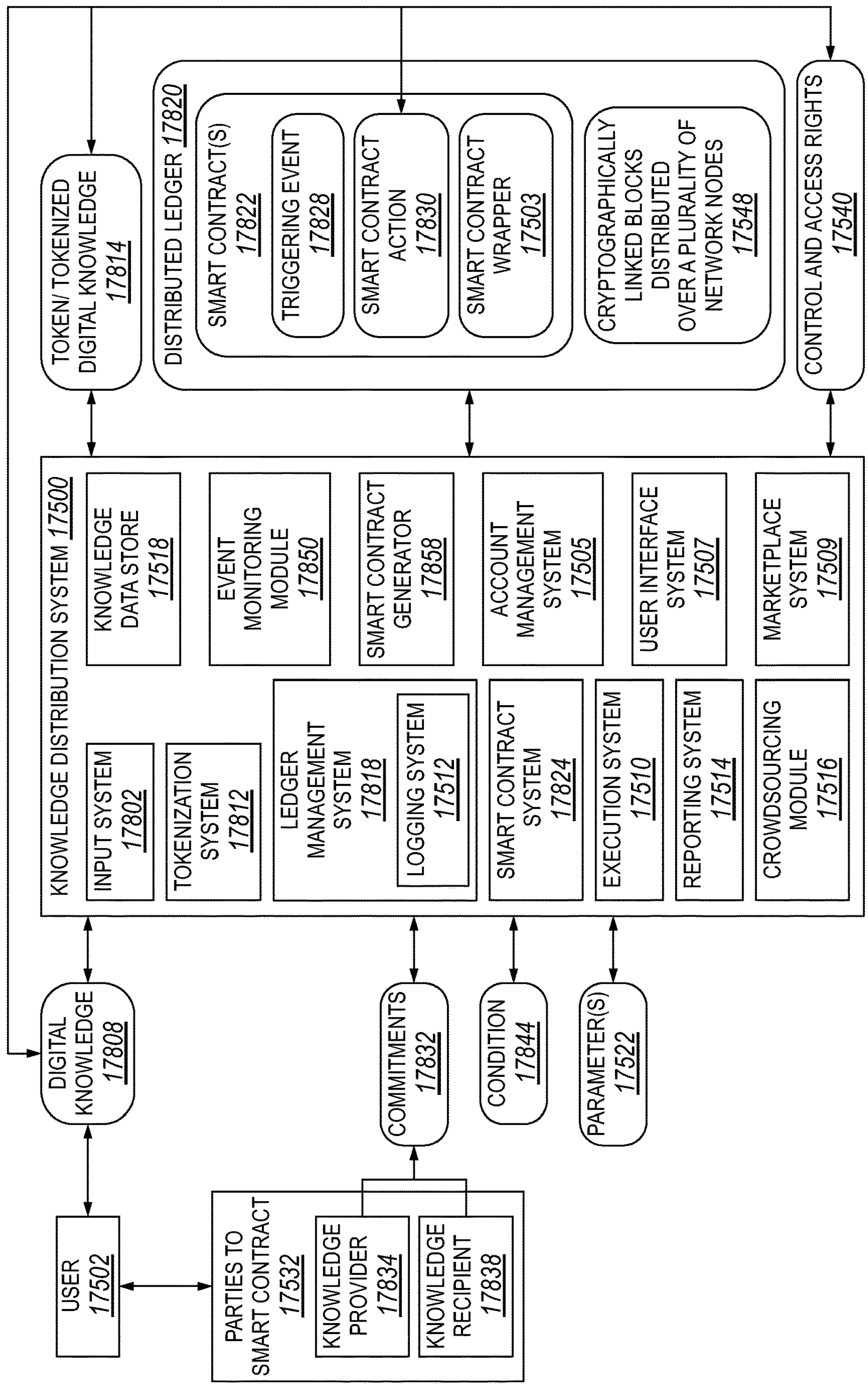

FIG. 175 depicts a knowledge distribution system for controlling rights related to digital knowledge.

Figure 176:
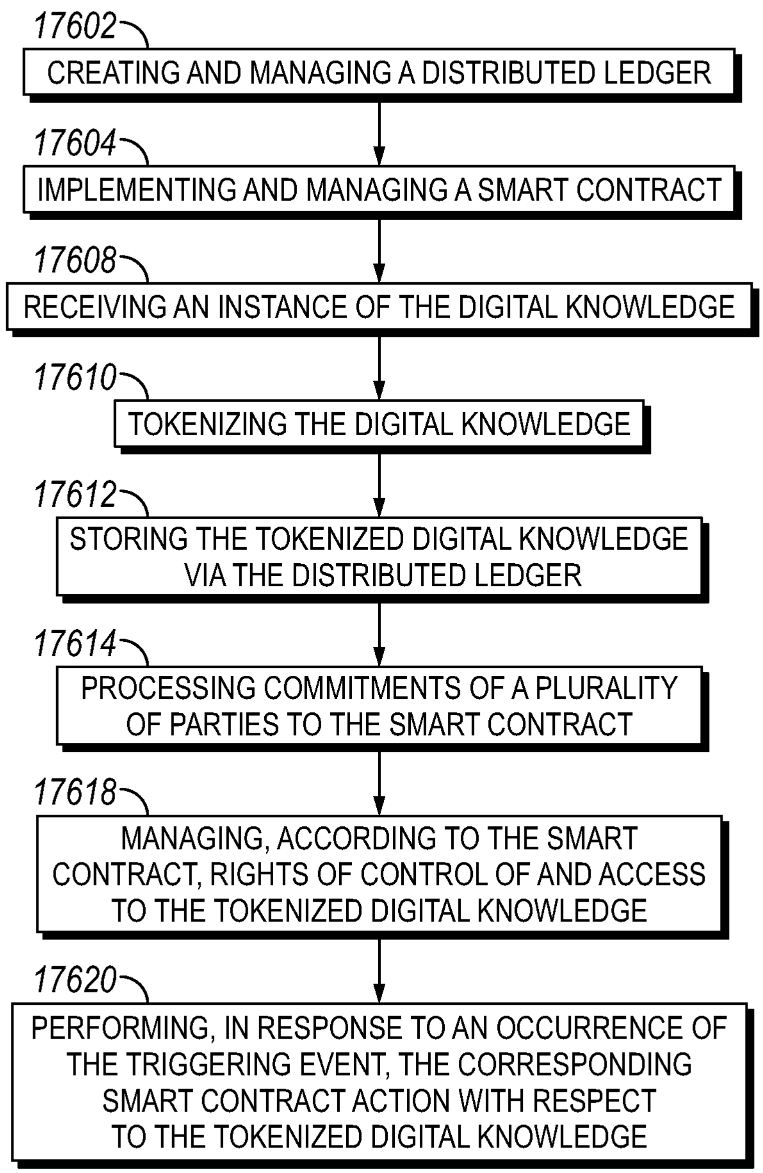

FIG. 176 depicts a computer-implemented method for controlling rights related to digital knowledge.

Figure 177:
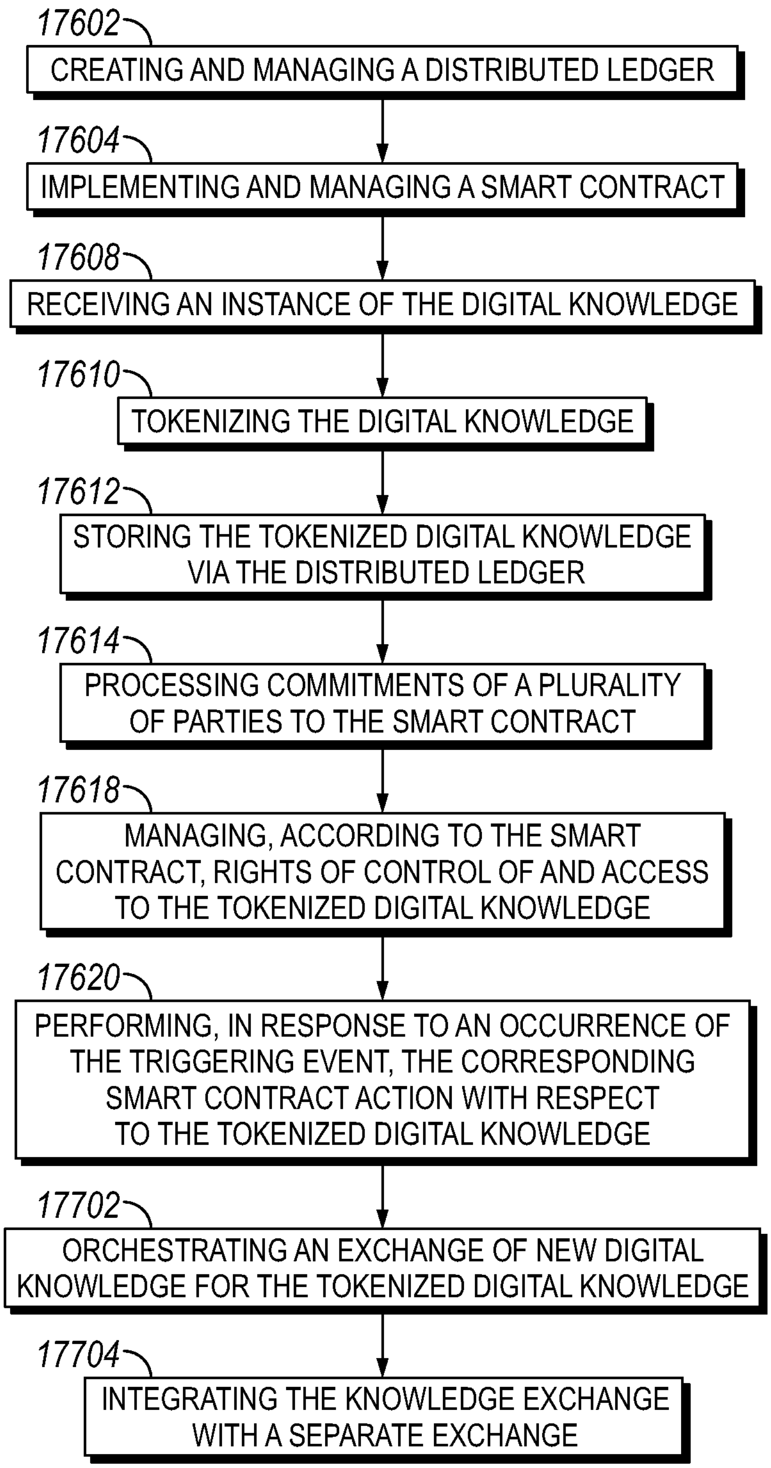

FIG. 177 depicts a computer-implemented method for controlling rights related to digital knowledge.

Figure 178:
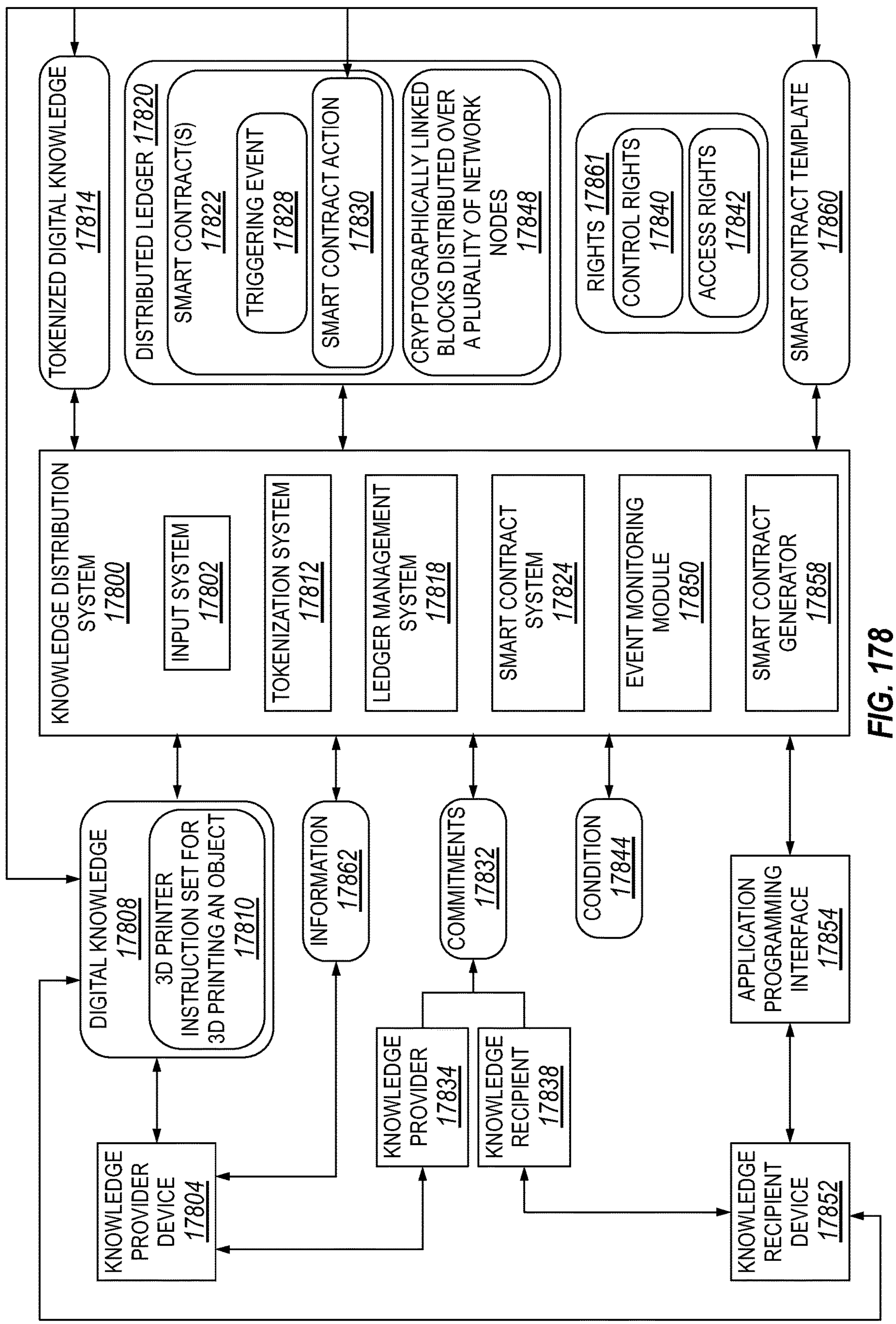

FIG. 178 depicts a knowledge distribution system for controlling rights related to digital knowledge.

Figure 179:
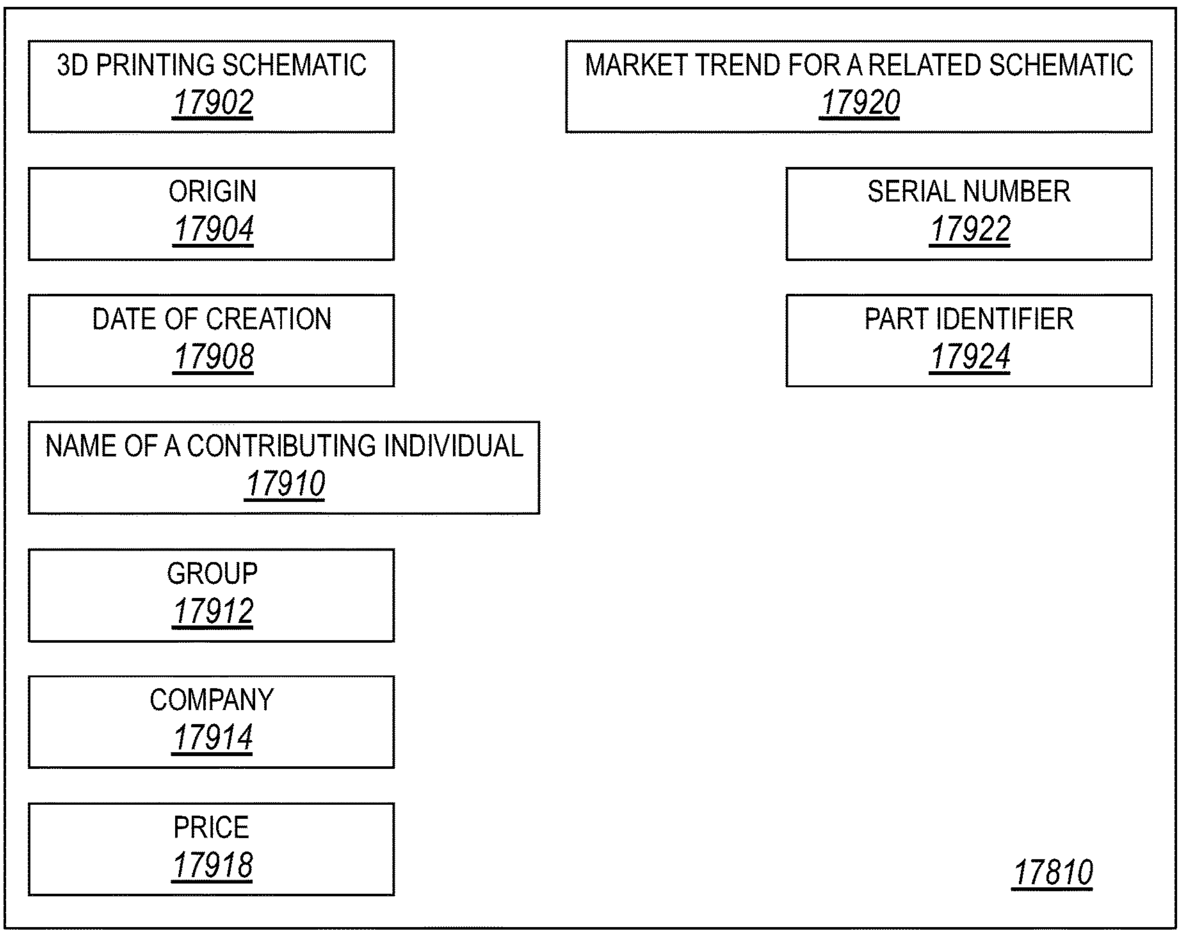

FIG. 179 depicts possible components of a 3D printer instruction set.

Figure 180:
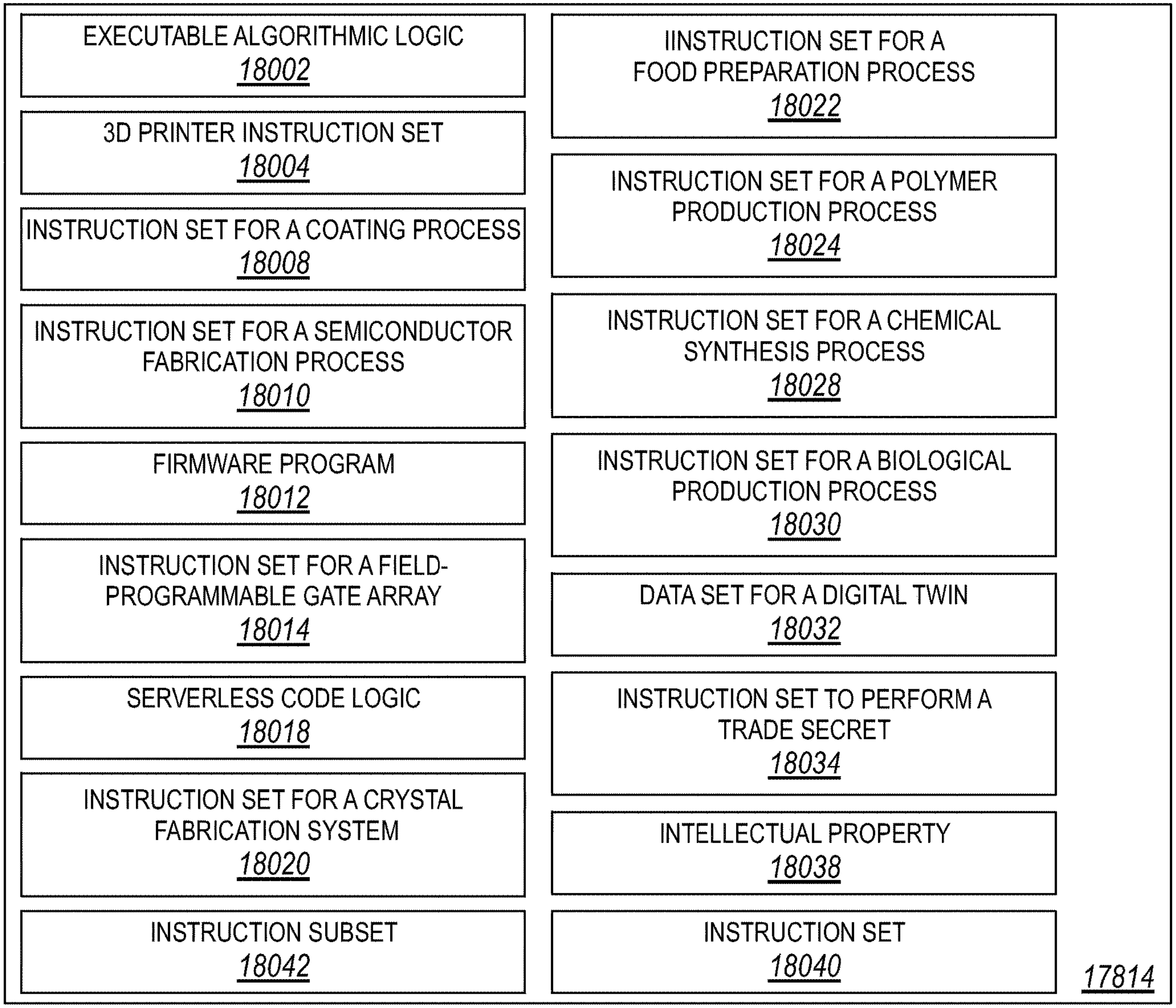

FIG. 180 depicts possible content of tokenized digital knowledge.

Figure 181:
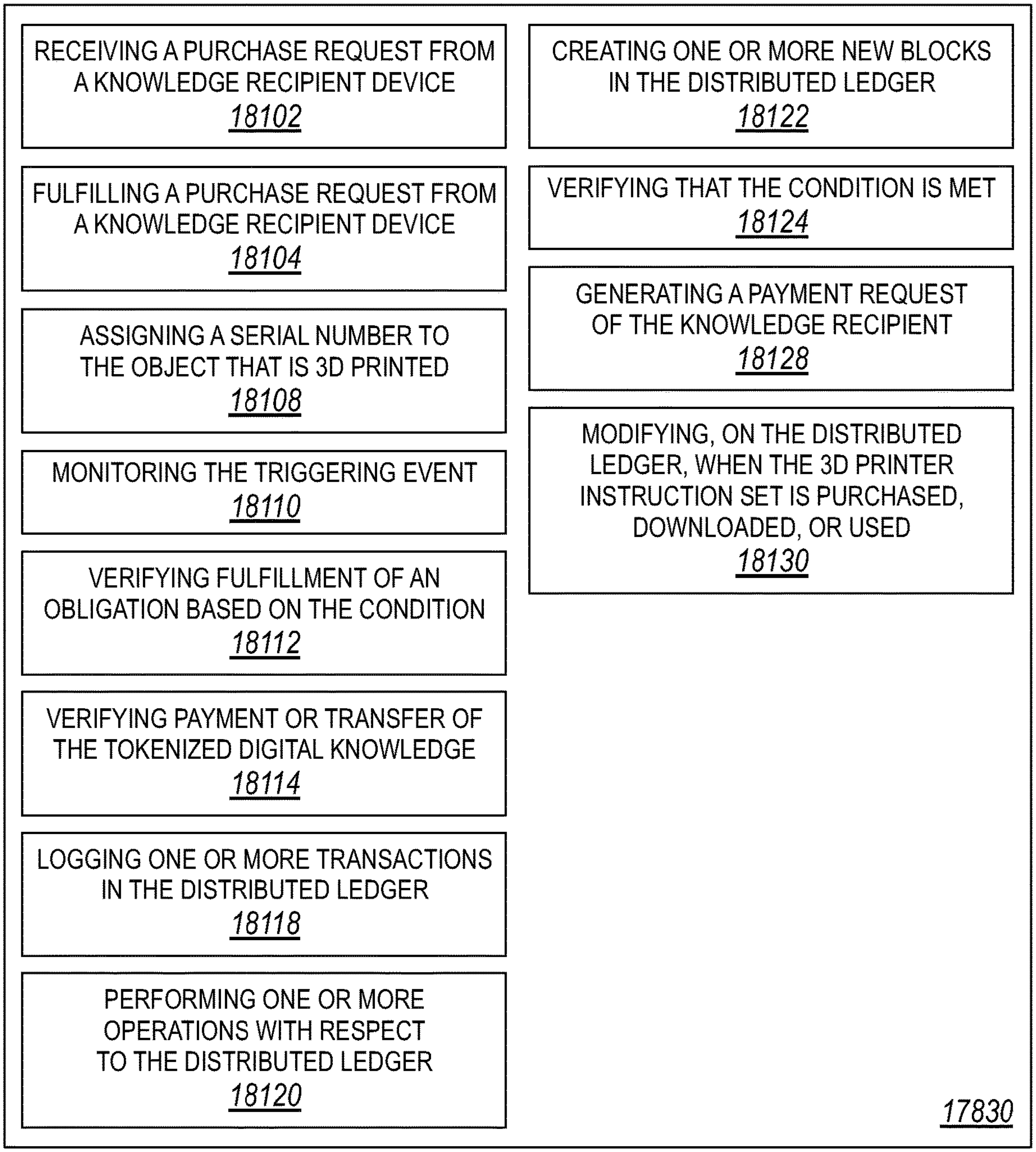

FIG. 181 depicts possible smart contract actions.

Figure 182:
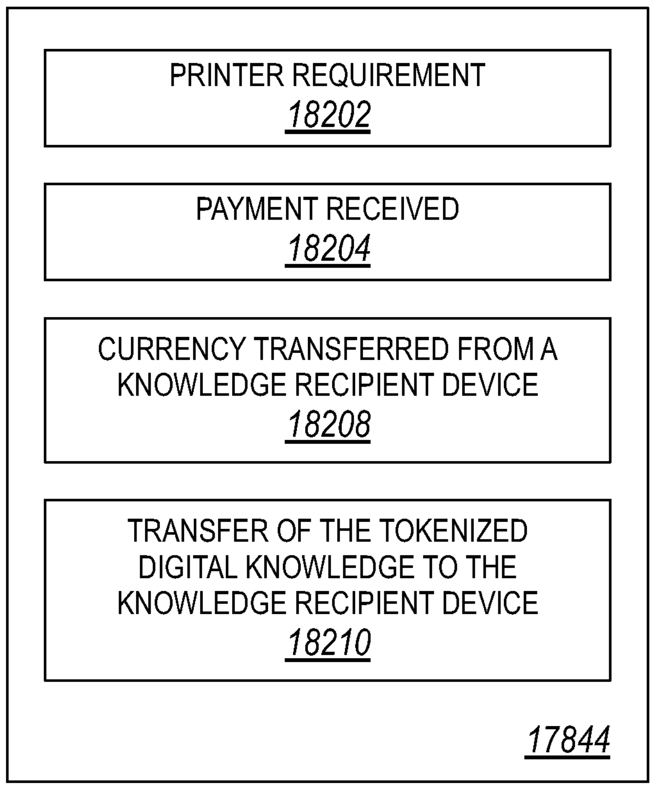

FIG. 182 depicts possible conditions relating to triggering events.

Figure 183:
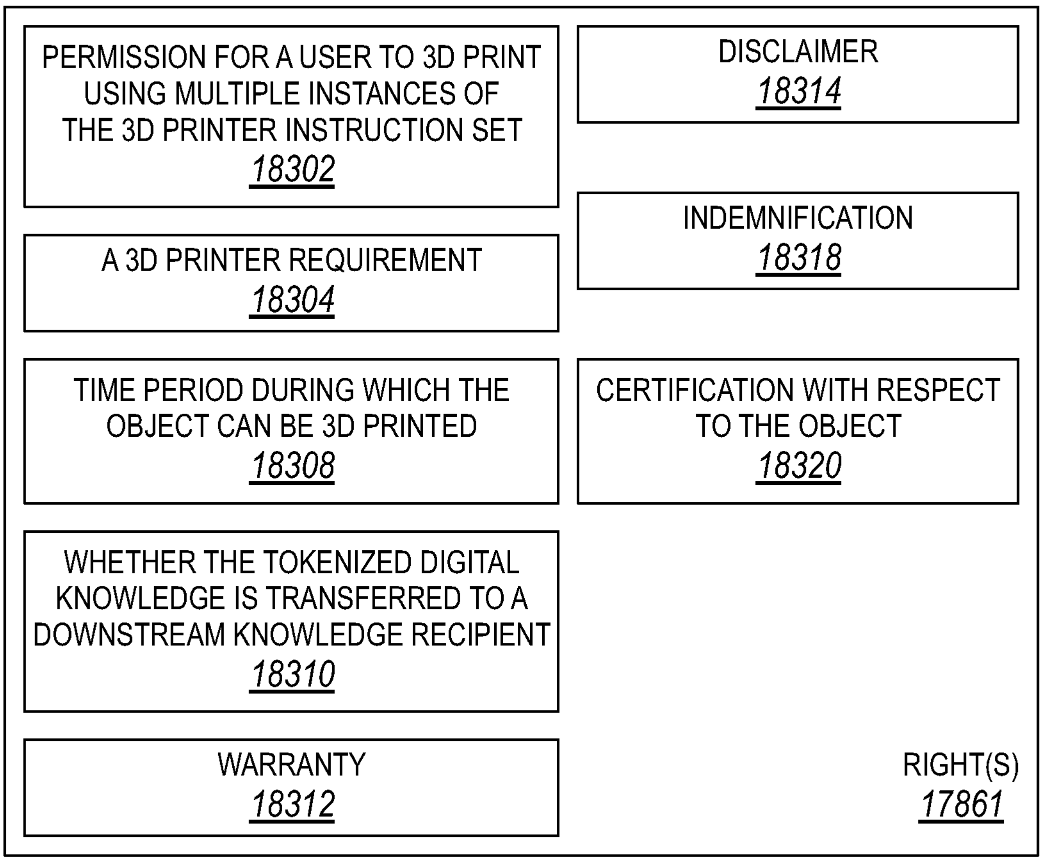

FIG. 183 depicts possible control and access rights.

Figure 184:
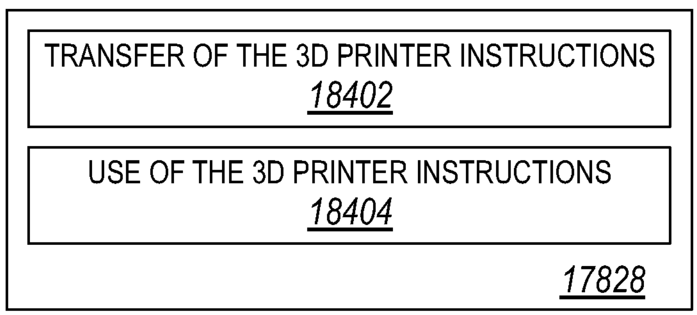

FIG. 184 depicts possible triggering events.

Figure 185:
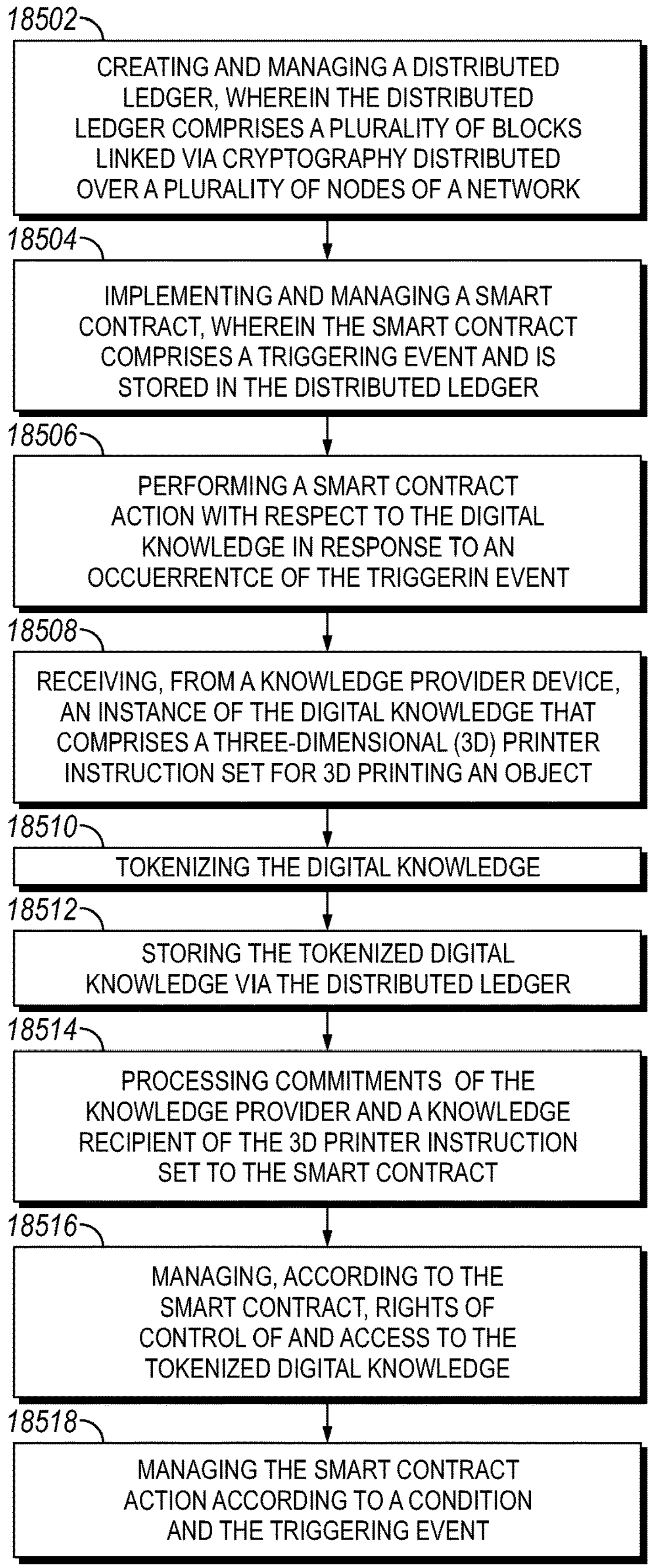

FIG. 185 depicts a computer-implemented method for controlling rights related to digital knowledge.

Figure 186:
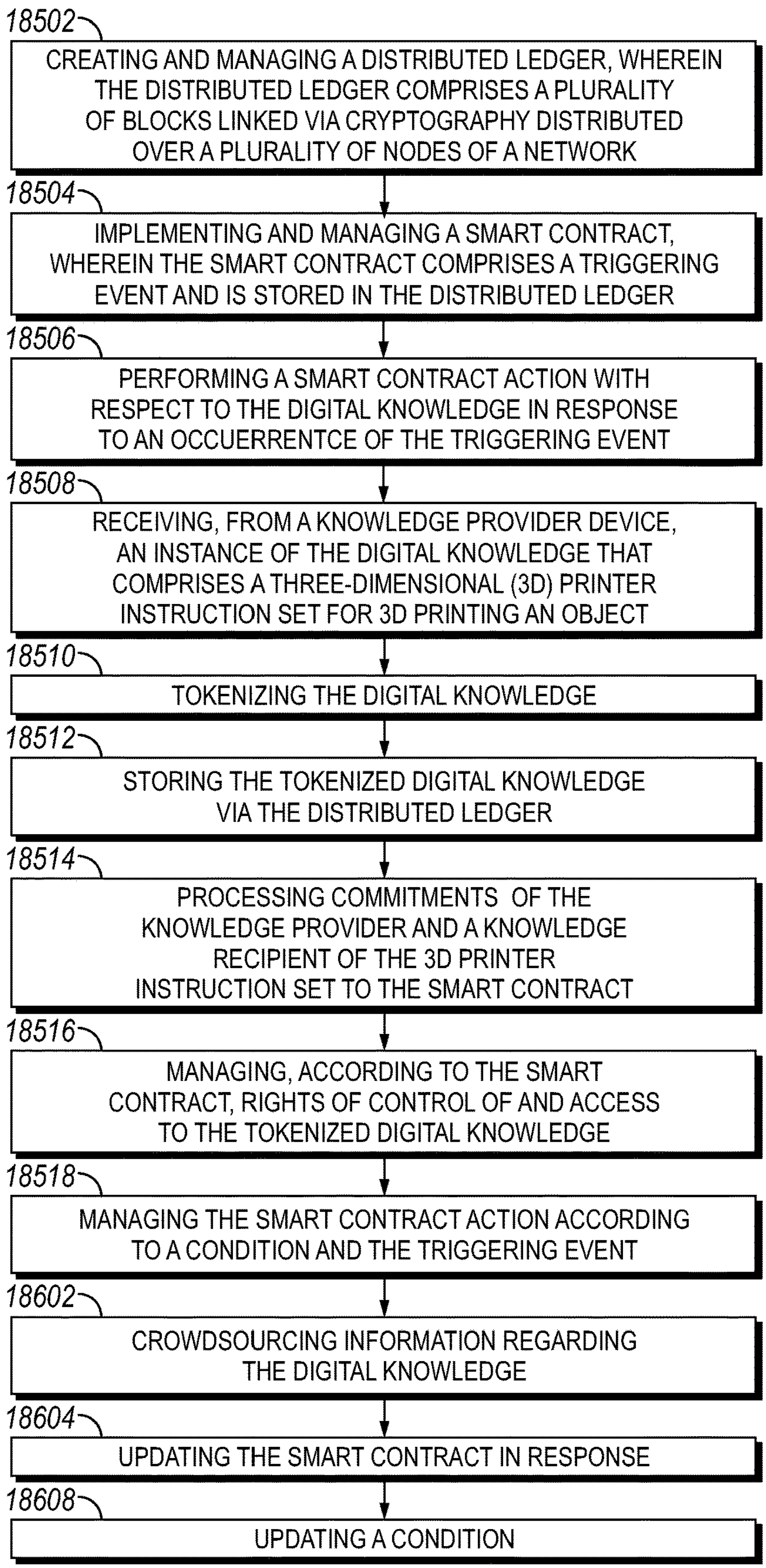

FIG. 186 depicts a computer-implemented method for controlling rights related to digital knowledge.

Figure 187:
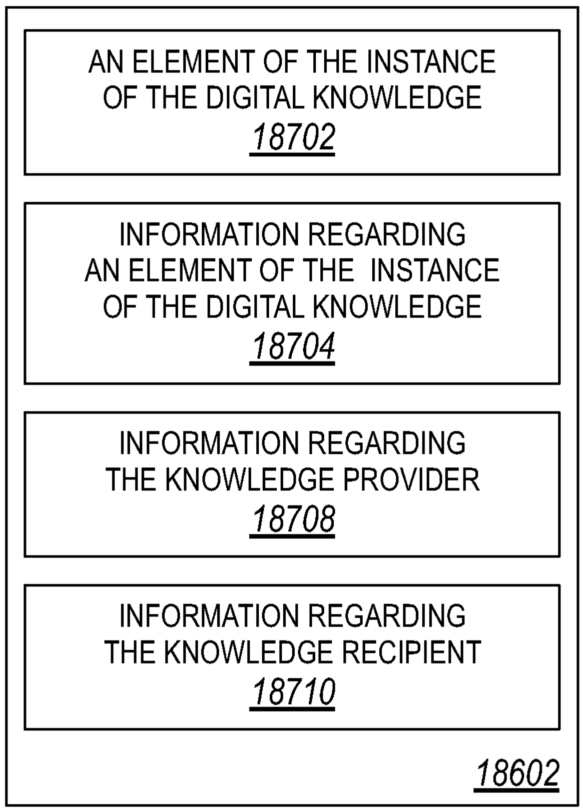

FIG. 187 depicts possible crowdsourced information.

Figure 188:
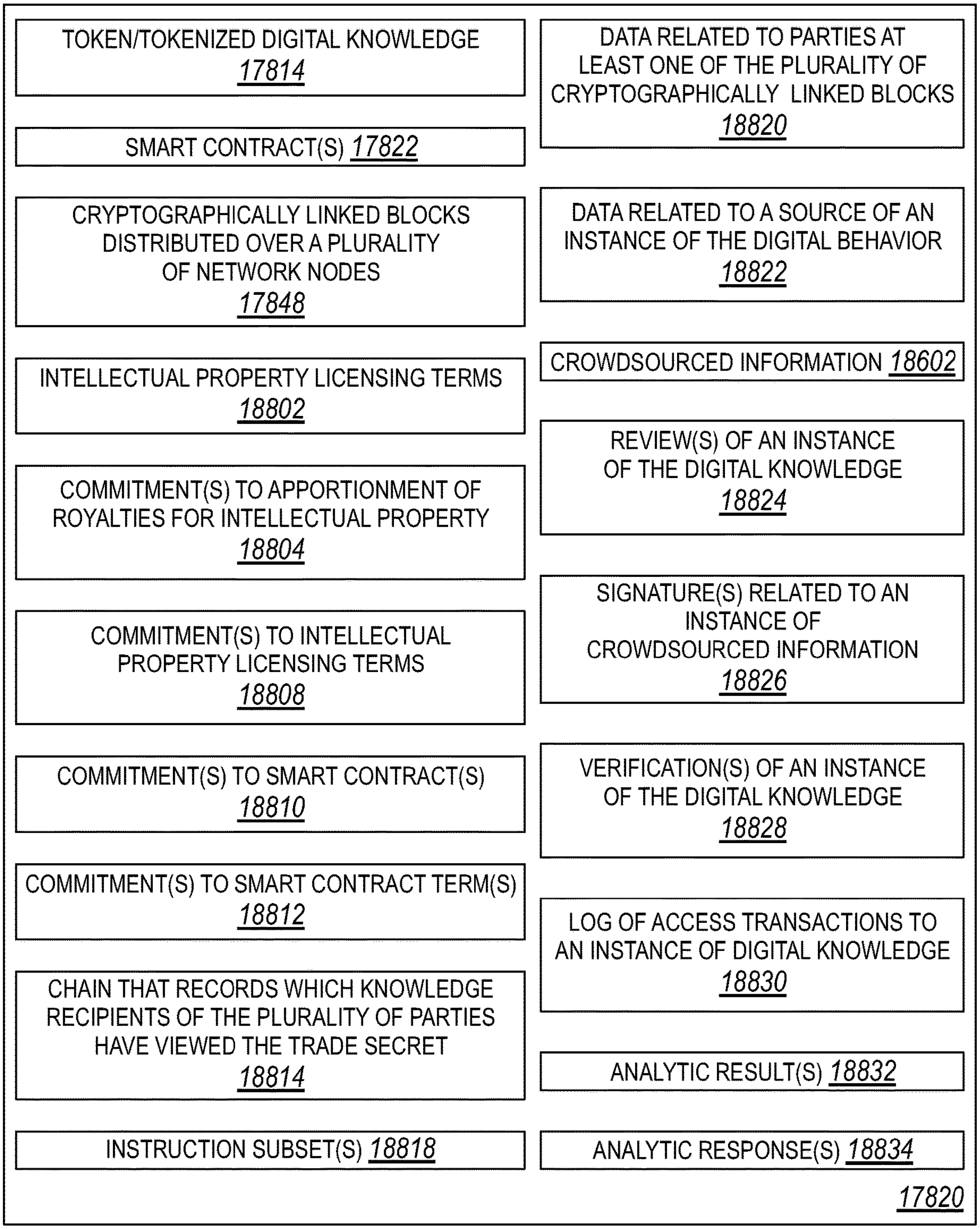

FIG. 188 depicts possible contents of a distributed ledger.

Figure 189:
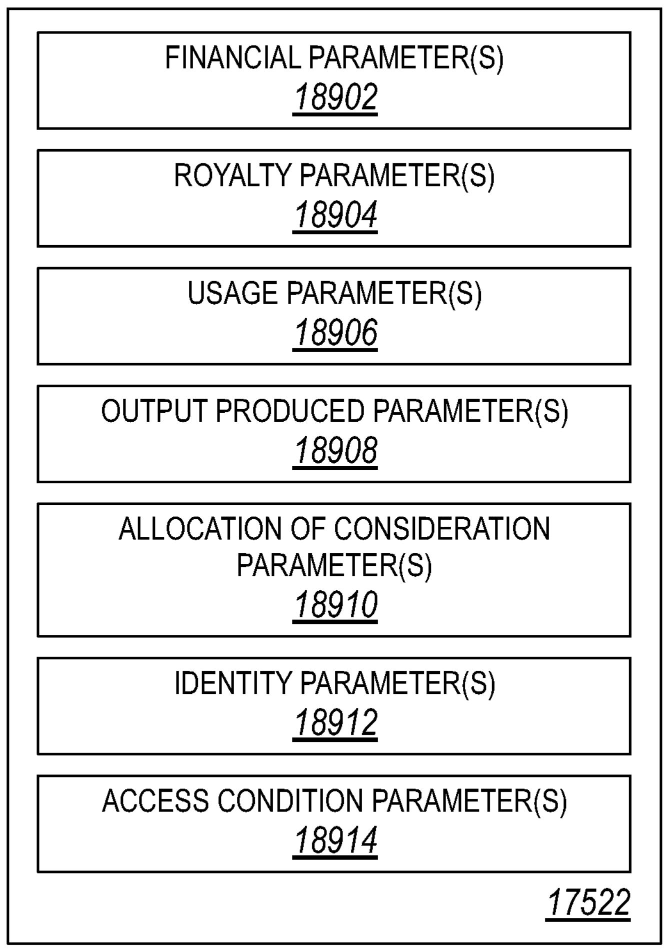

FIG. 189 depicts possible parameters.

Figure 190:
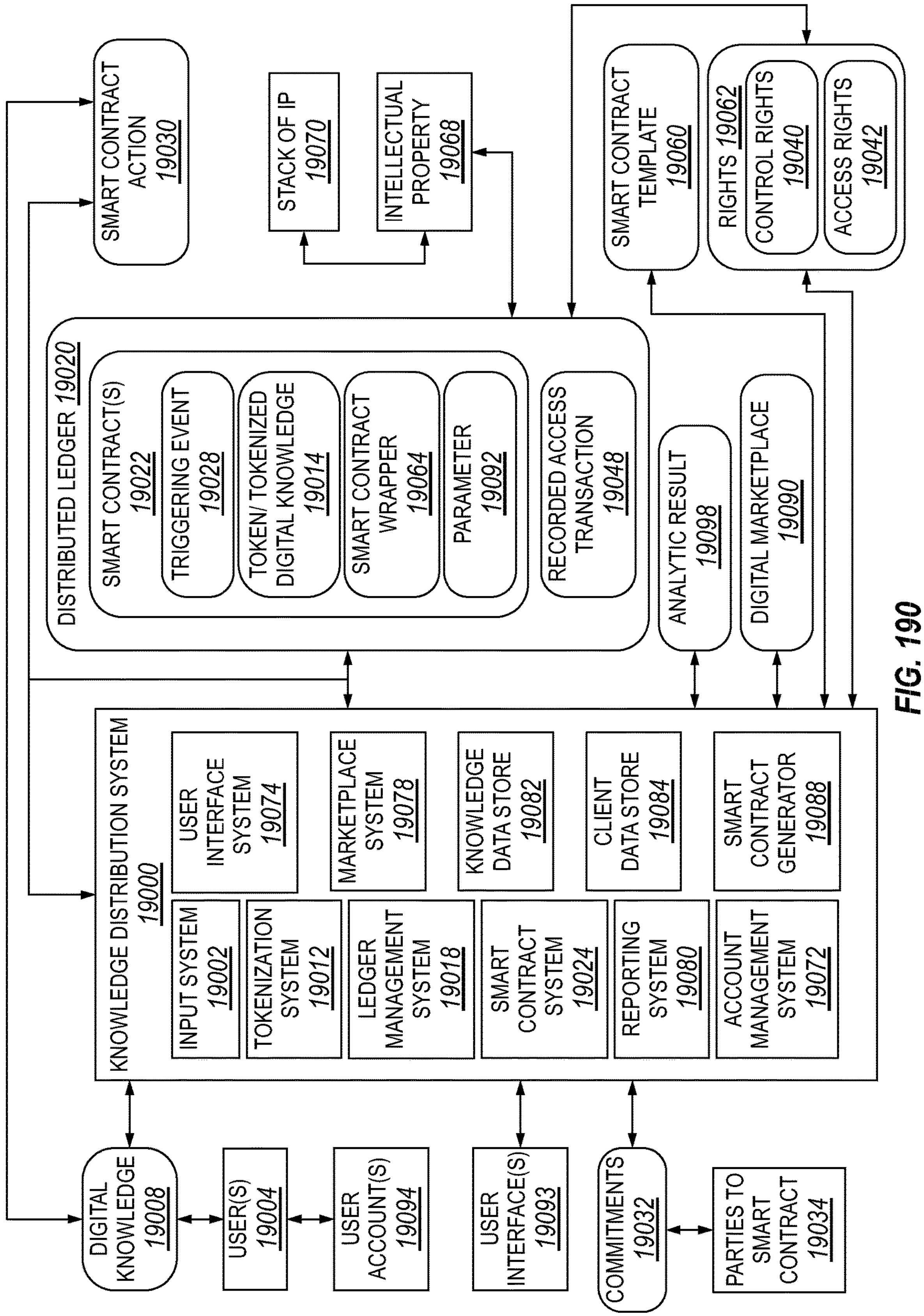
Figure 191:
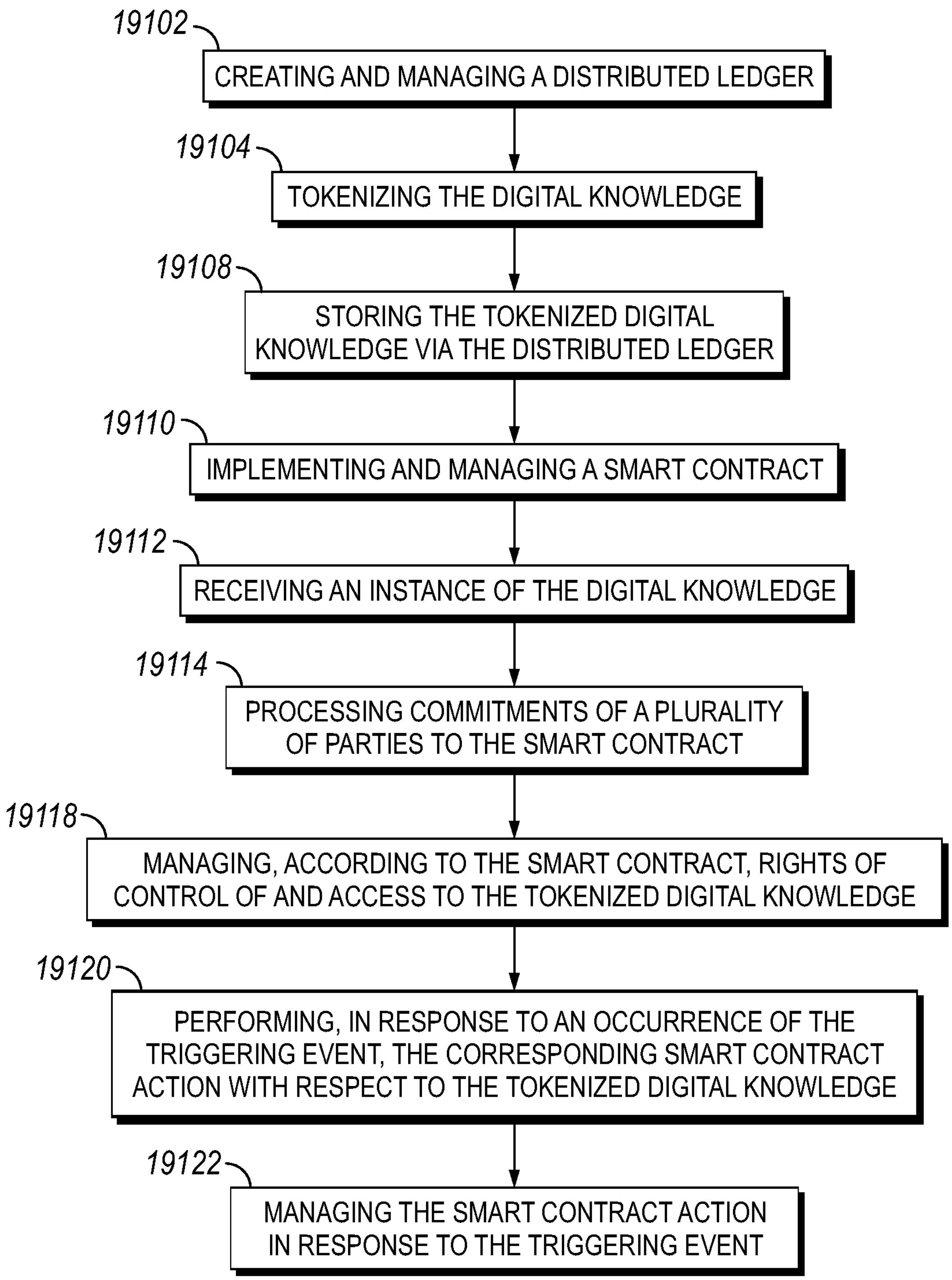
Figure 192:
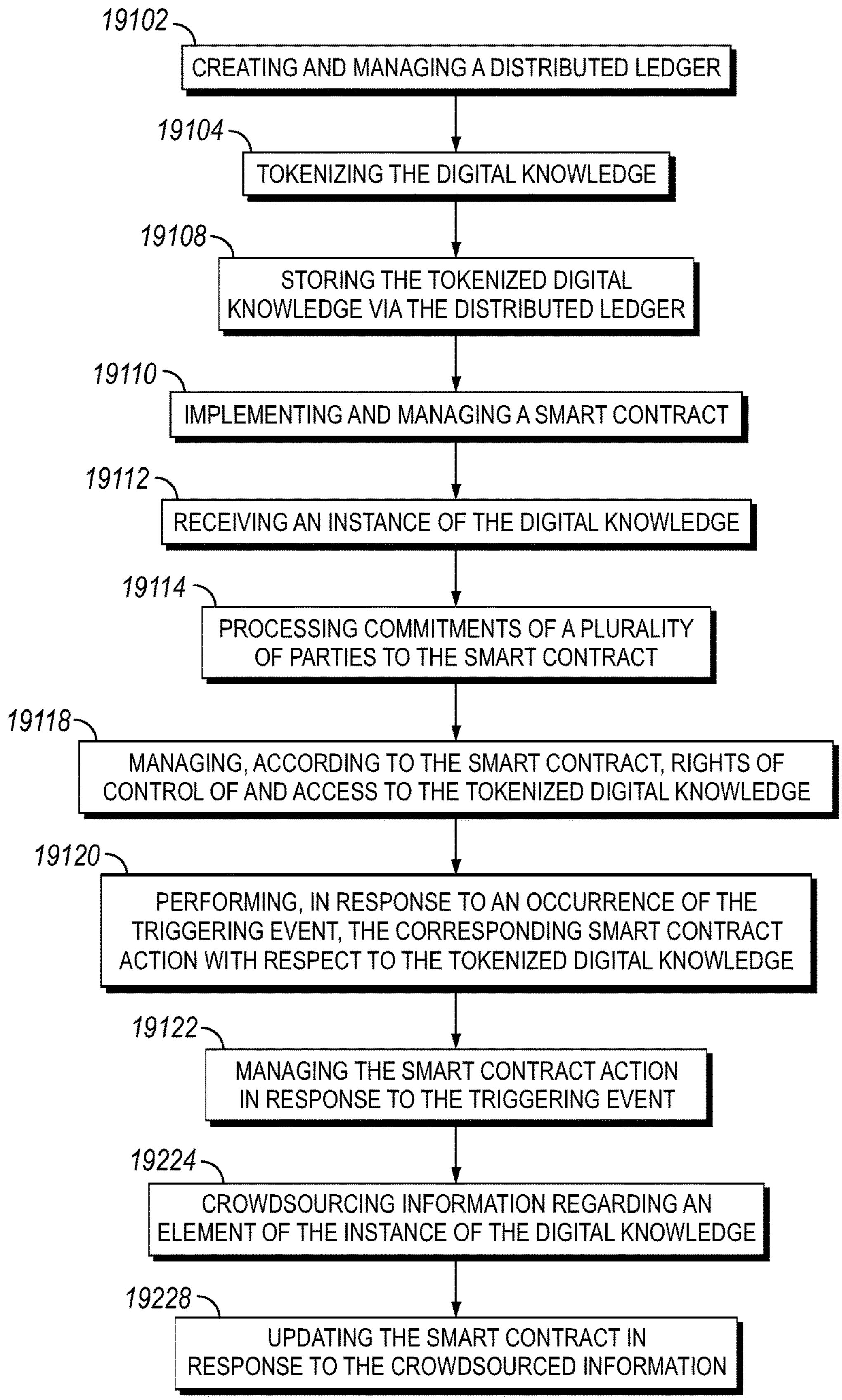
Figure 193:
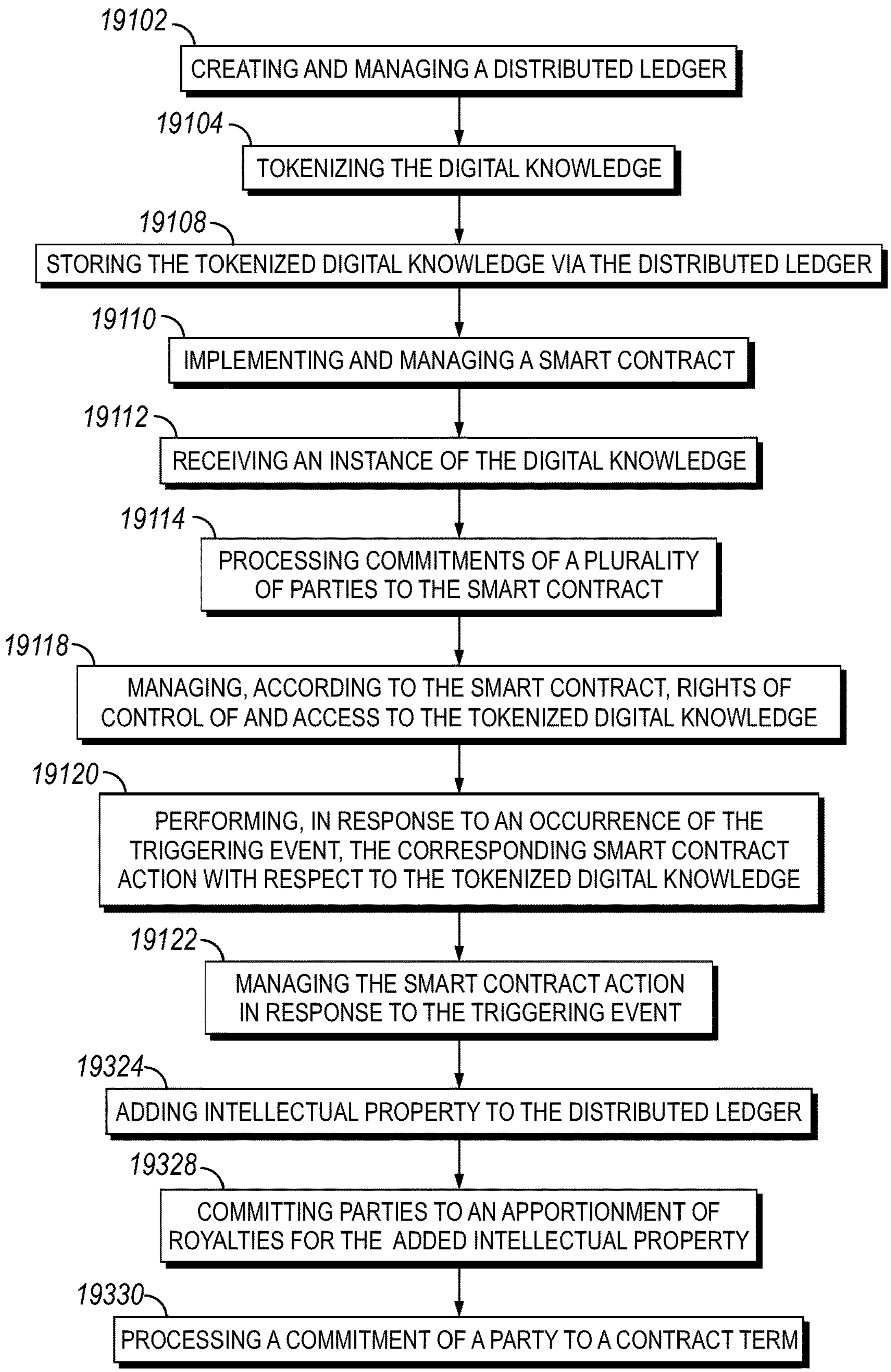
Figure 194:
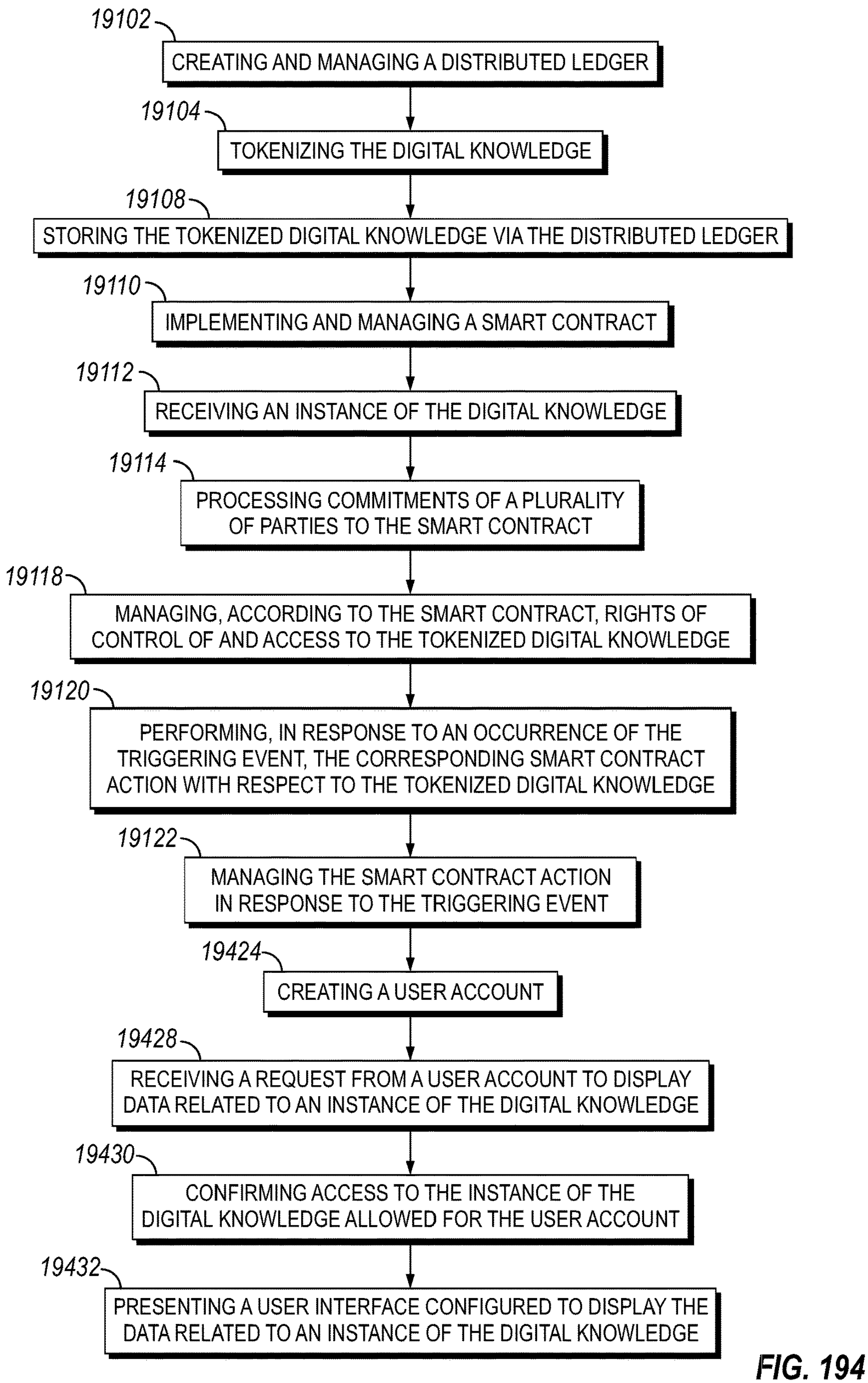
Figure 195:
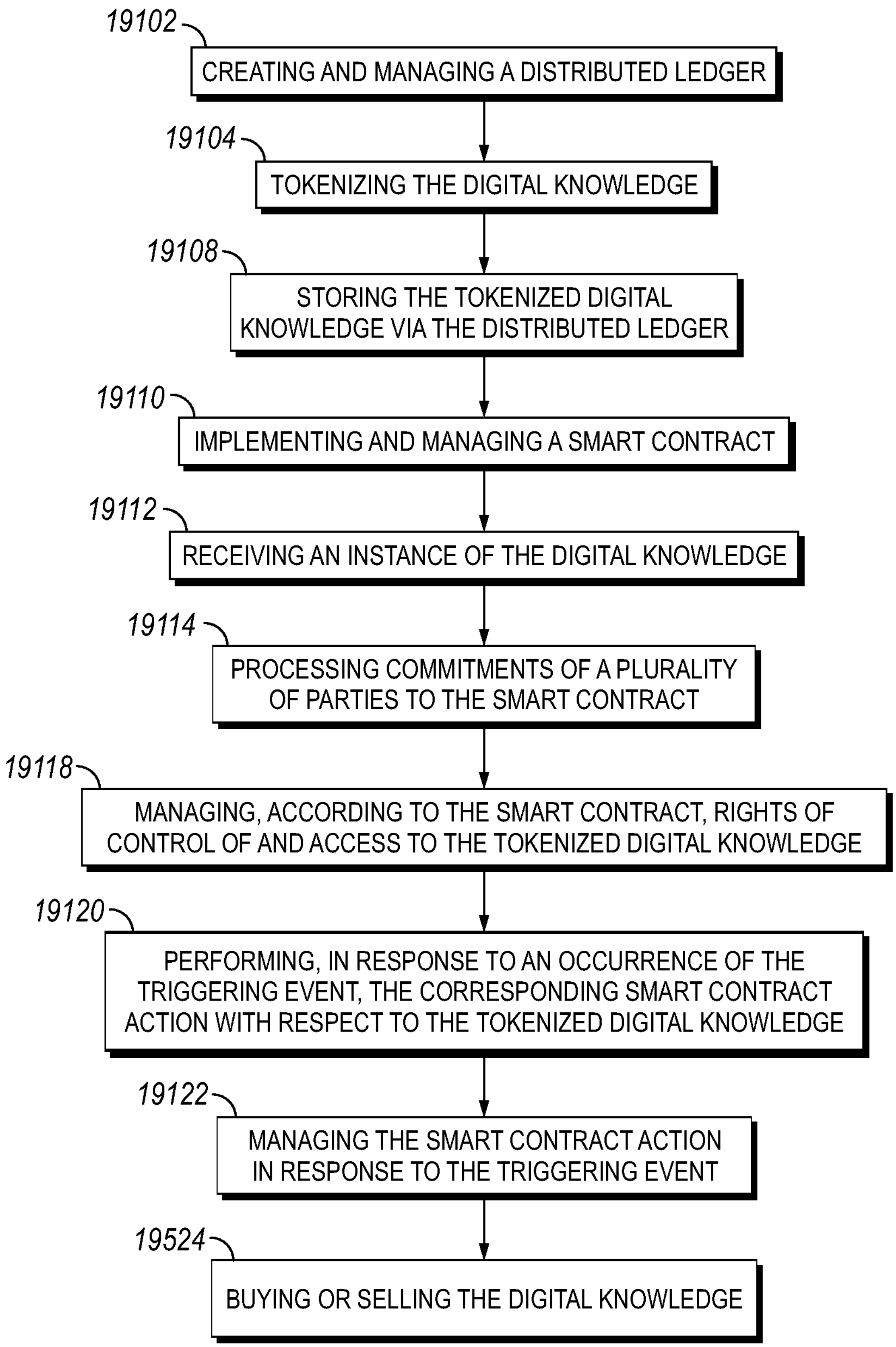
Figure 196:
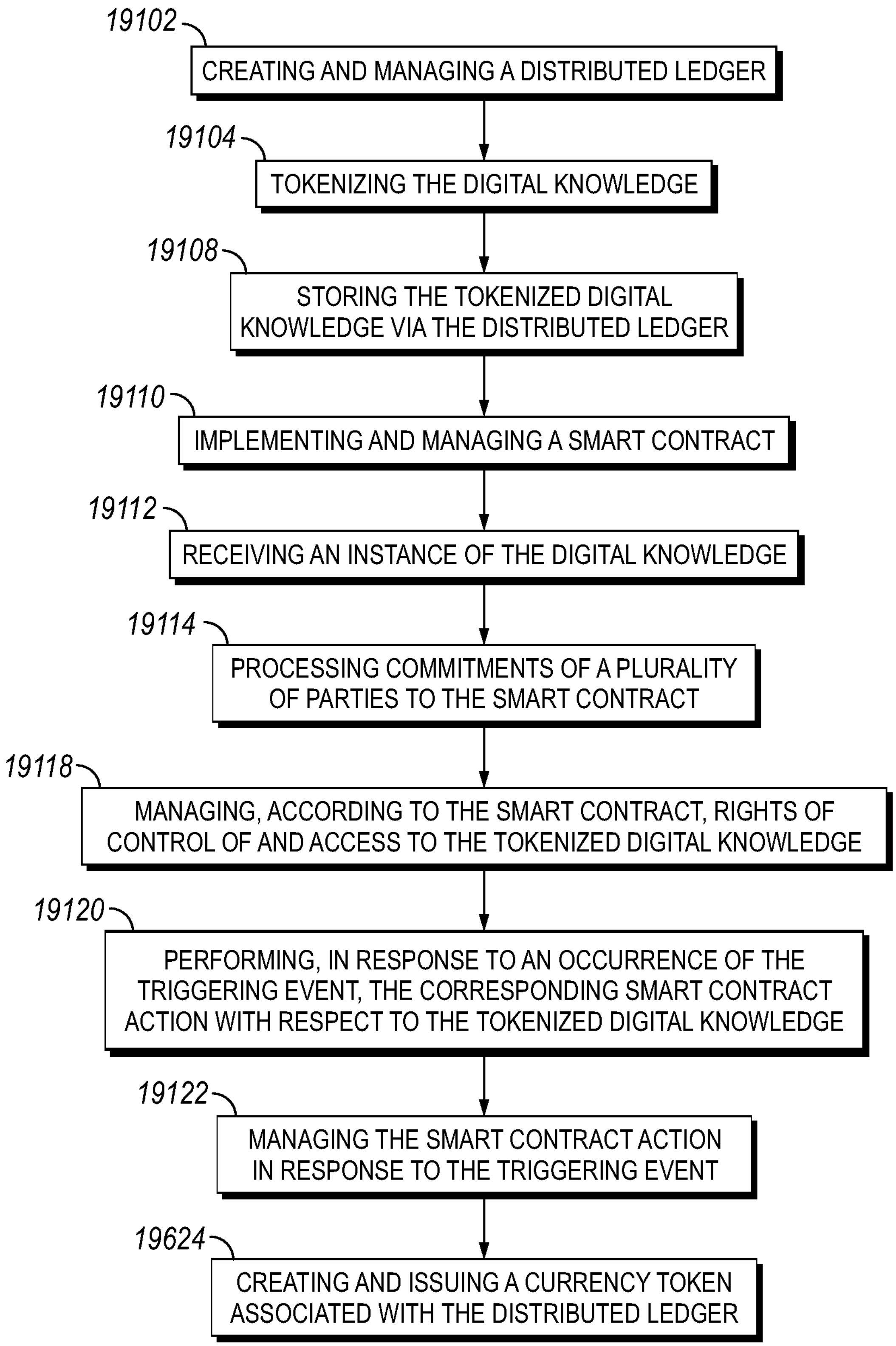

FIG. 190 depicts an embodiment of a knowledge distribution system for controlling rights related to digital knowledge.

FIGS. 191-196 depict embodiments of operations for controlling rights related to digital knowledge.

Figure 197:
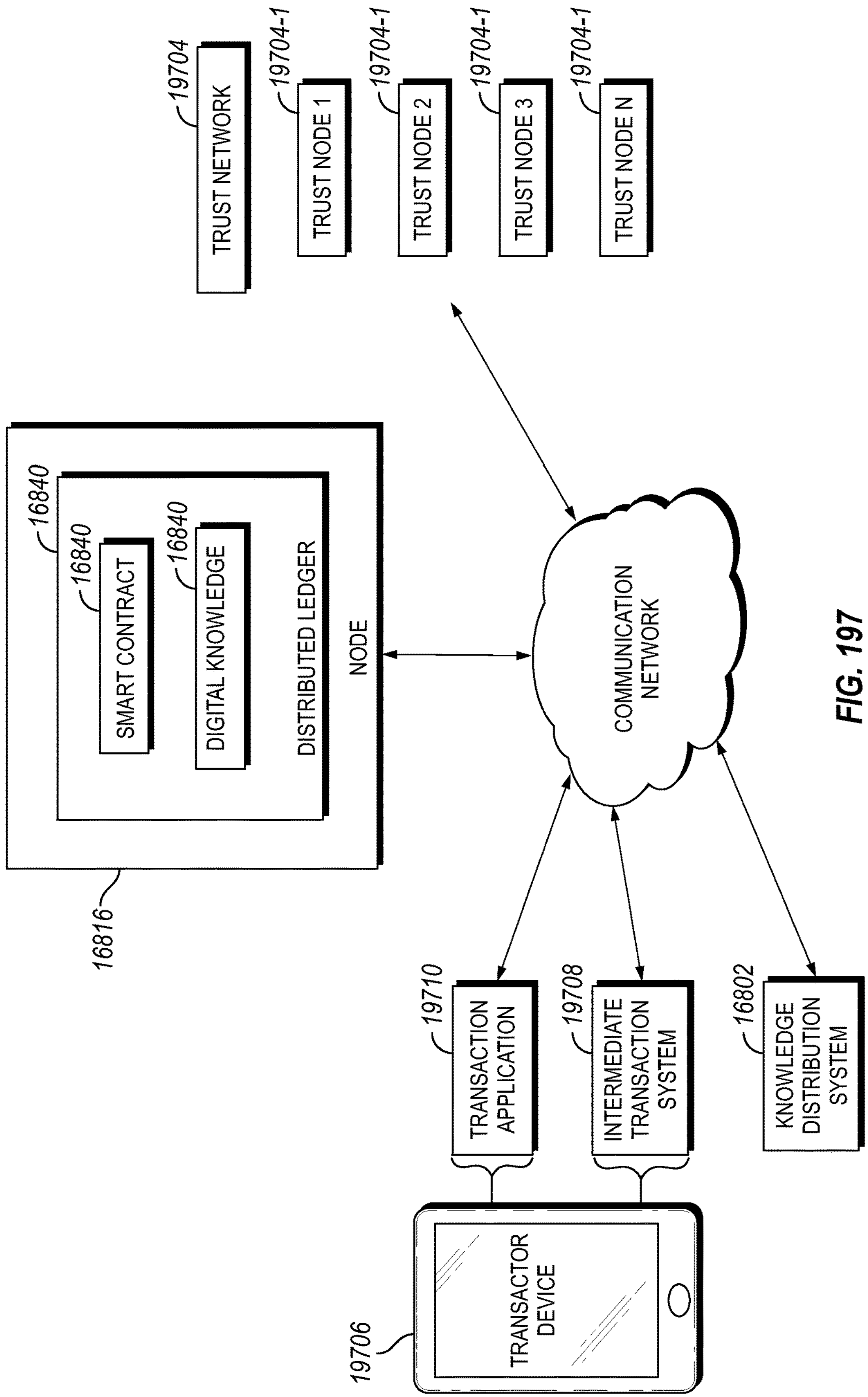

FIG. 197 is a diagrammatic view illustrating an example implementation of the knowledge distribution system including a trust network for identifying the likelihood of fraudulent transactions using a consensus trust score and preventing such fraudulent transactions according to some embodiments of the present disclosure.

Figure 198:
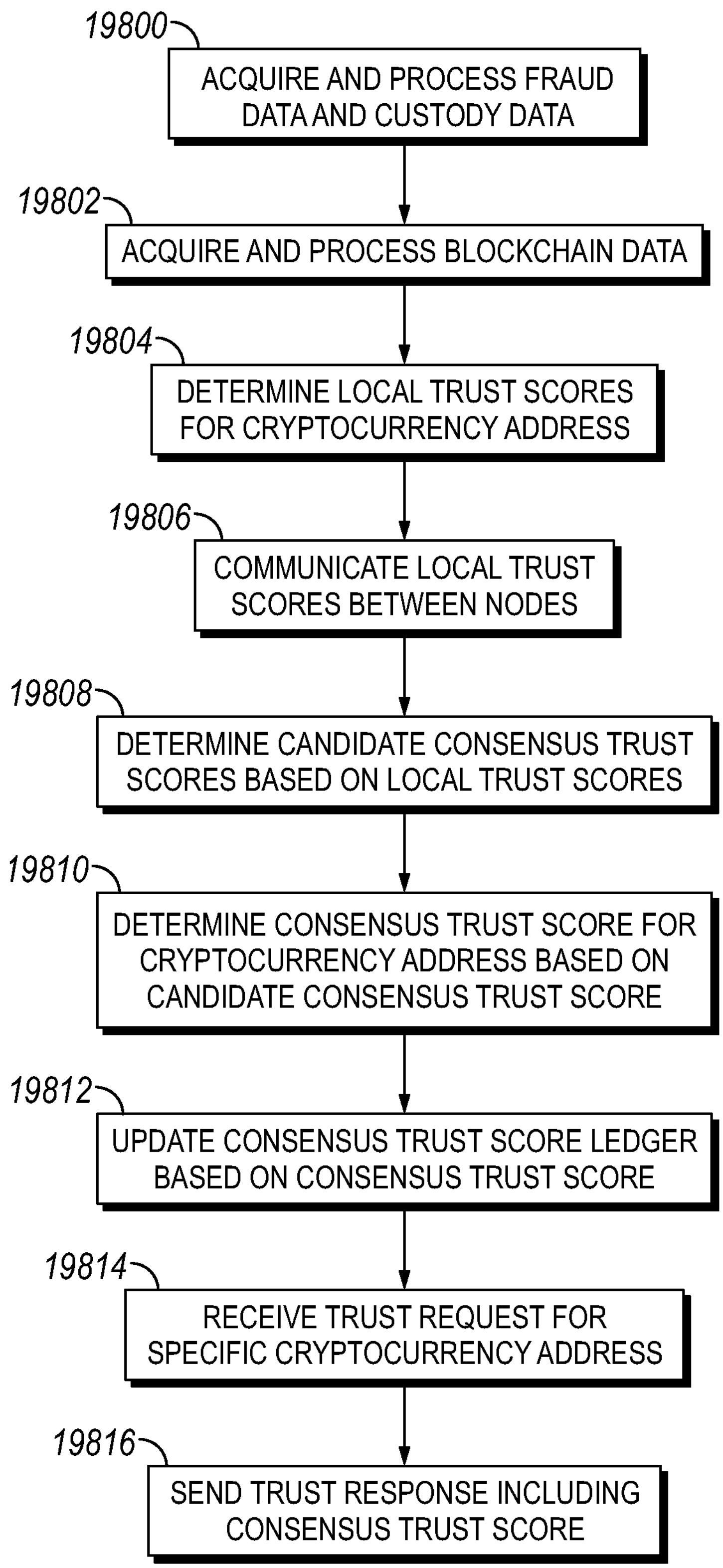

FIG. 198 illustrates an example method that describes operation of an example trust network illustrated in FIG. 197 according to some embodiments of the present disclosure.

Figure 199:
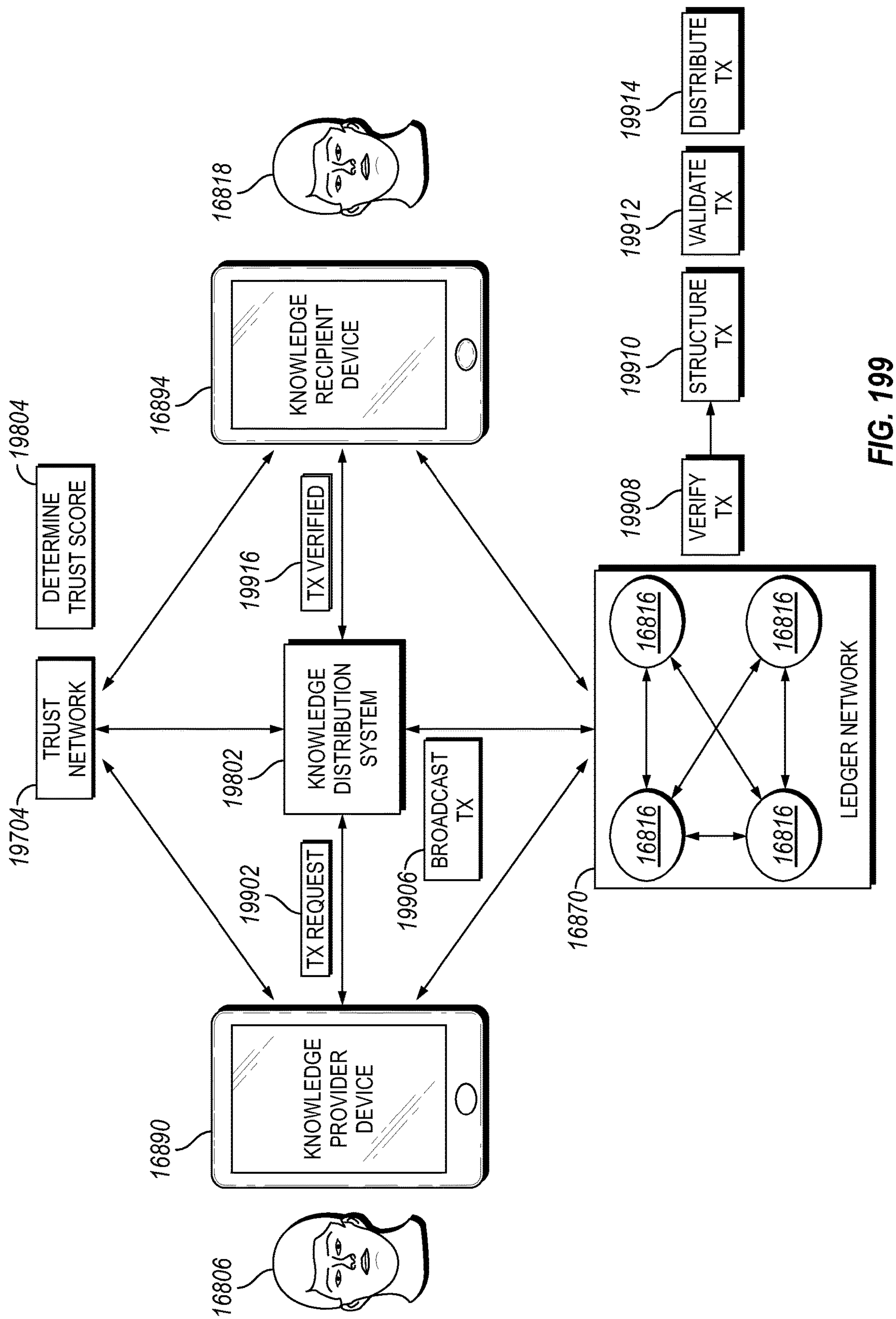

FIG. 199 is a diagrammatic view illustrating a transaction being processed by the ledger network including a plurality of node computing devices according to some embodiments of the present disclosure.

Figure 200:
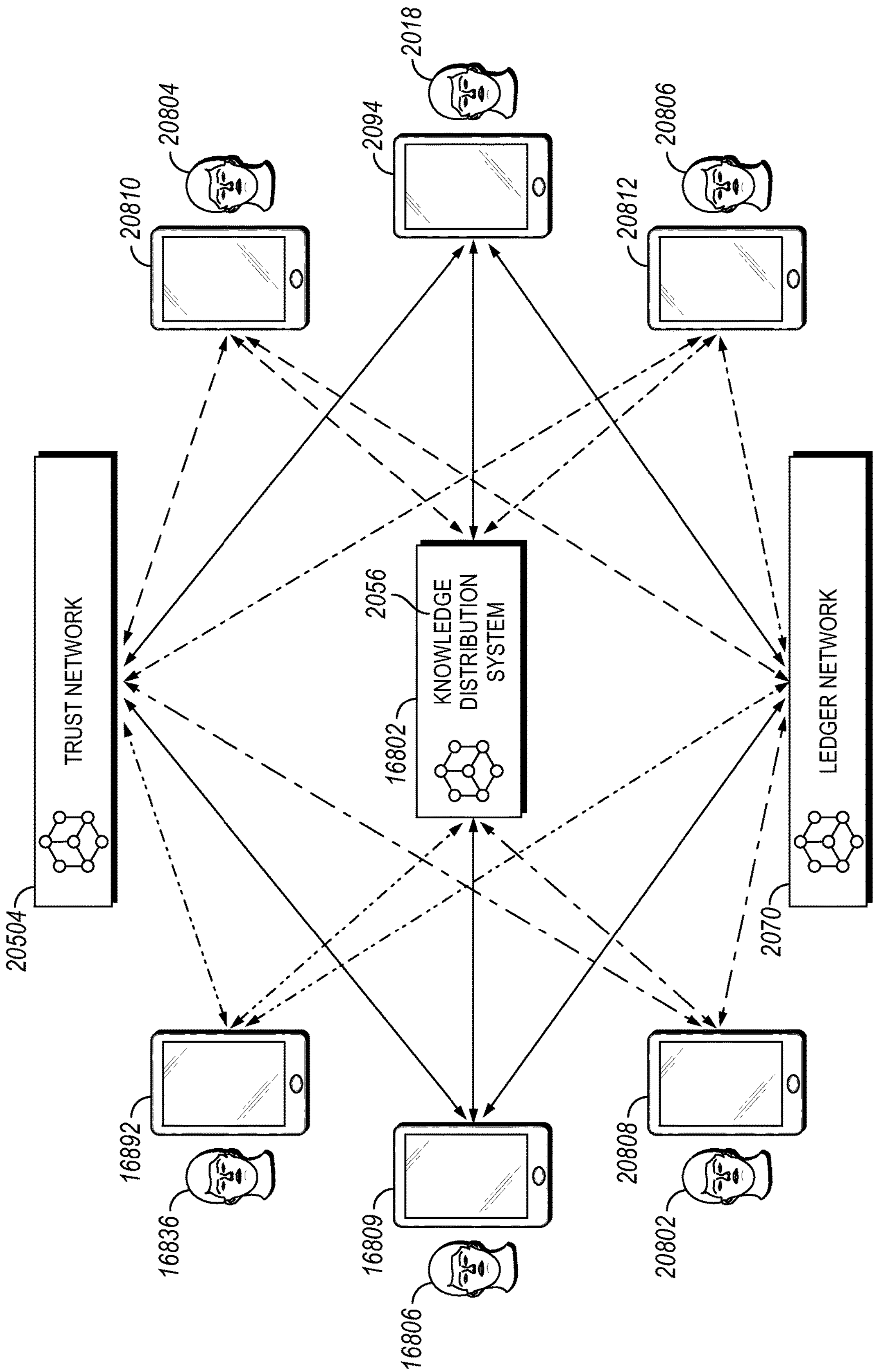

FIG. 200 is a diagrammatic view illustrating an example implementation of the knowledge distribution system including a digital marketplace configured to provide an environment allowing knowledge providers and knowledge recipients to engage in commerce relating to the transfer of digital knowledge according to some embodiments of the present disclosure.

Figure 201:
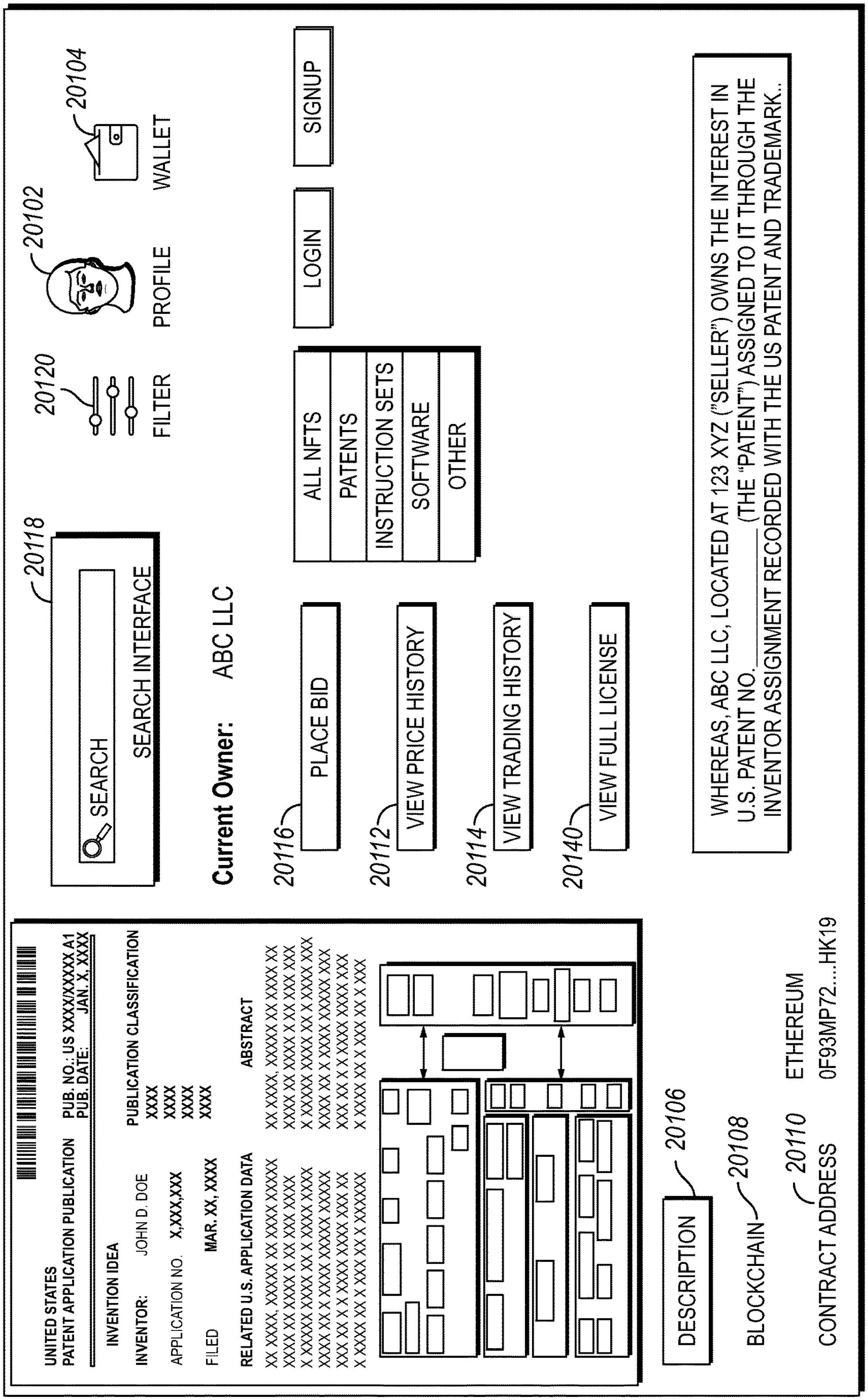

FIG. 201 is a diagrammatic view illustrating an example user interface of a digital marketplace configured to enable transactions and commerce between various users of the knowledge distribution system according to some embodiments of the present disclosure.

Figure 202:
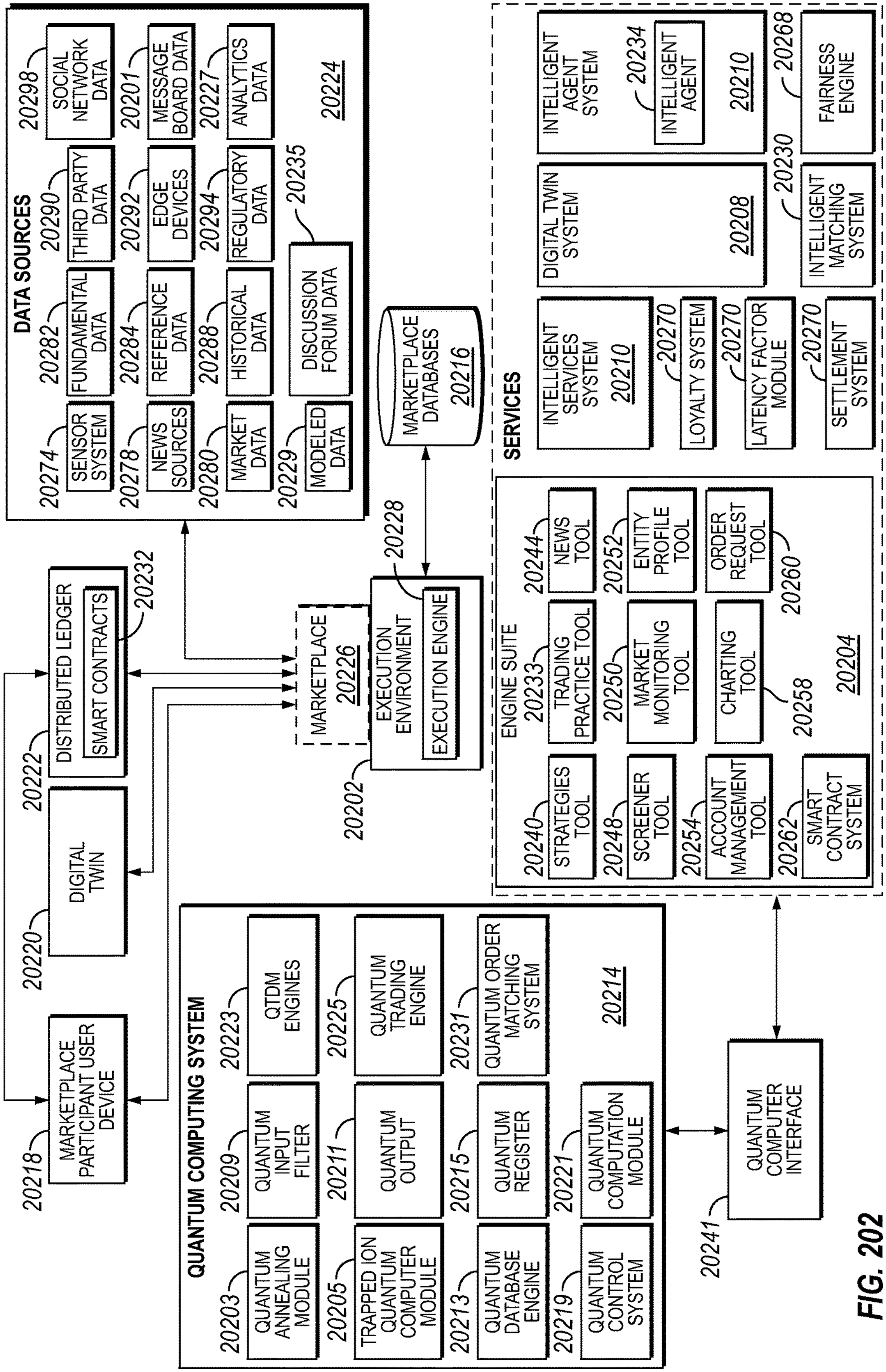

FIG. 202 is a schematic view of an exemplary embodiment of the market orchestration system according to some embodiments of the present disclosure.

Figure 203:
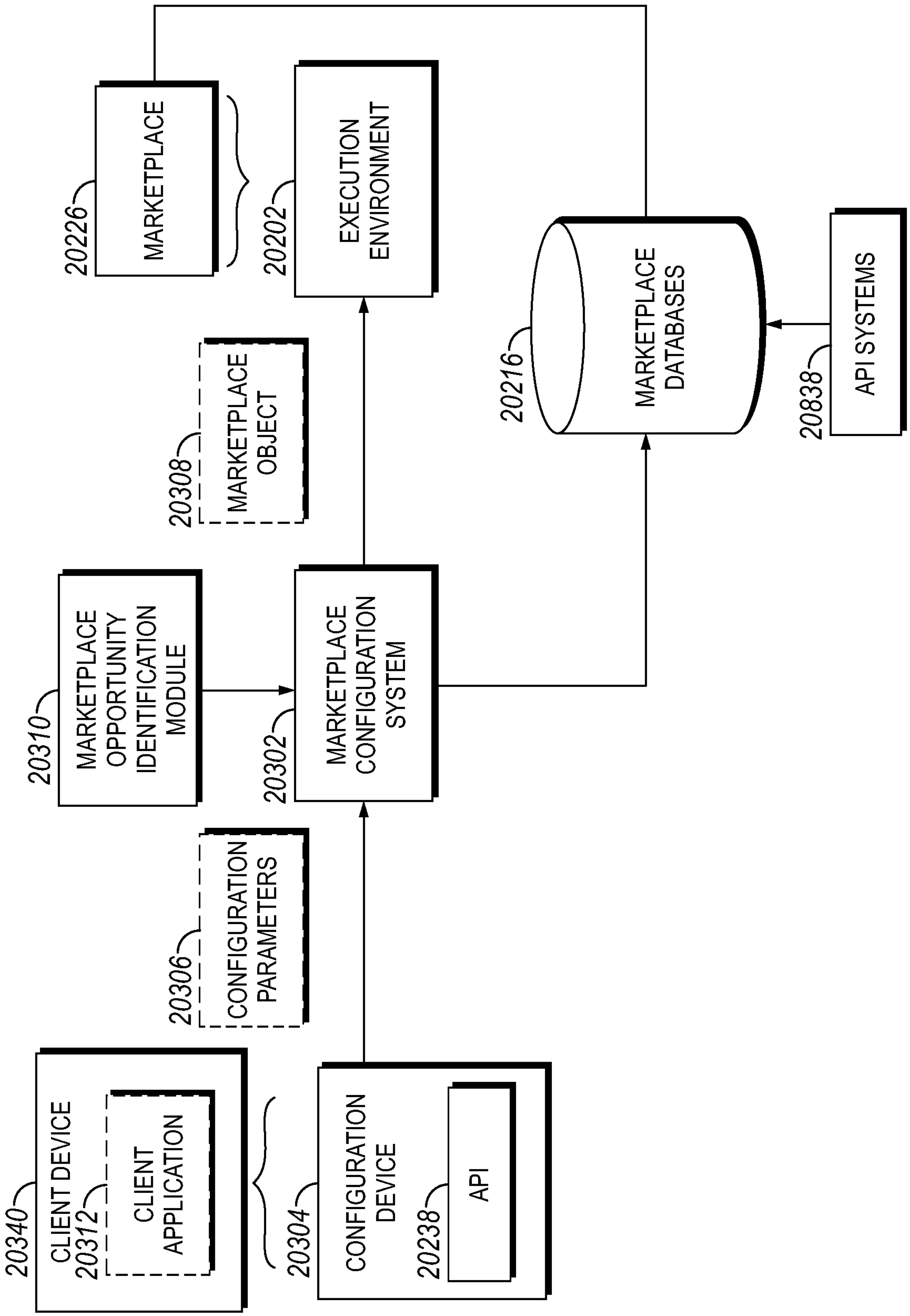

FIG. 203 is a schematic view of an exemplary embodiment of the market orchestration system including a marketplace configuration system for configuring and launching a marketplace.

Figure 204:
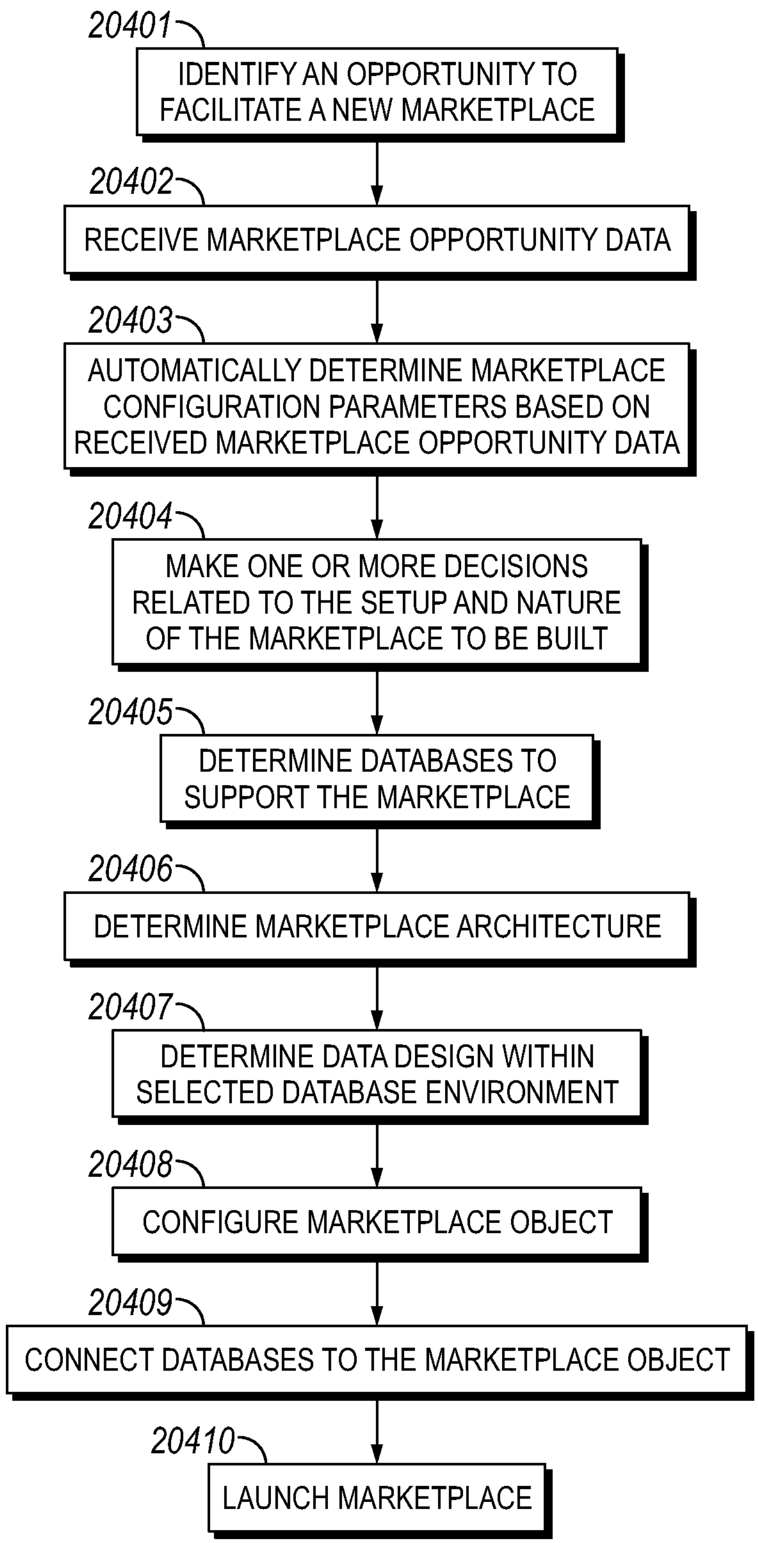

FIG. 204 is a schematic illustrating an example embodiment of a method of configuring and launching a marketplace according to some embodiments of the present disclosure.

Figure 205:
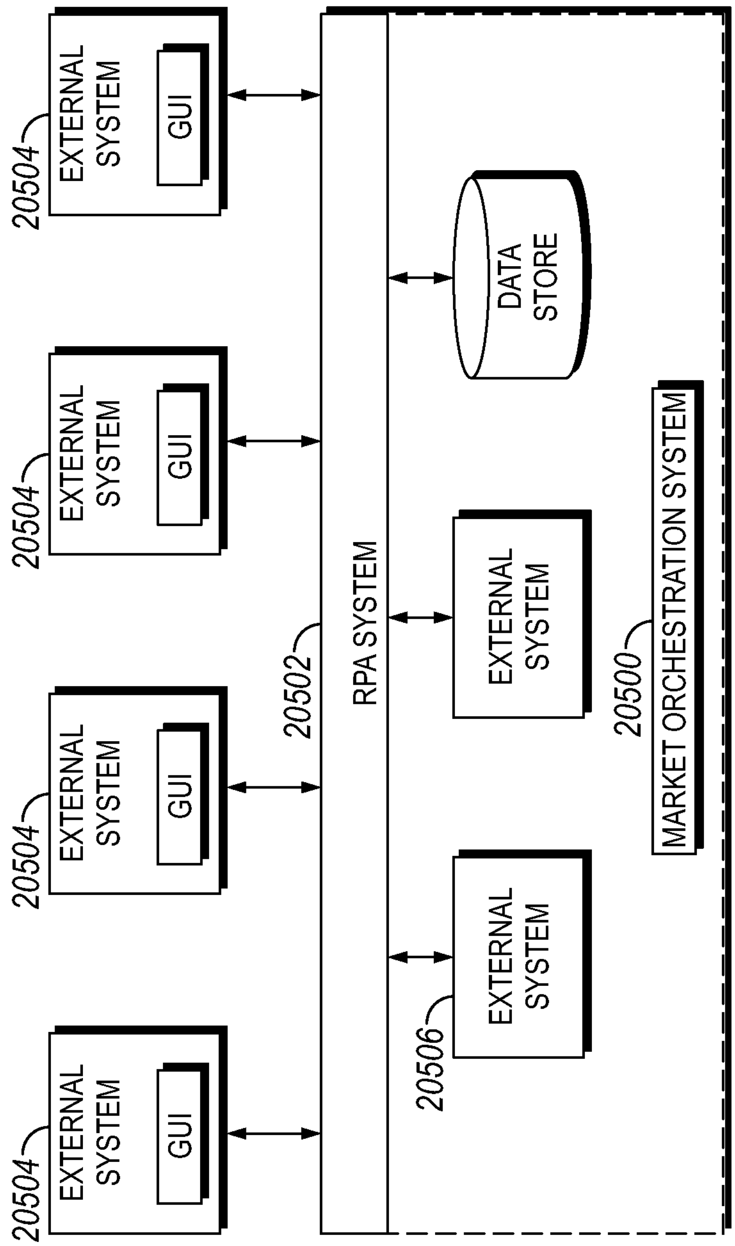

FIG. 205 is a schematic view of an exemplary embodiment of the market orchestration system including a robotic process automation system configured to automate internal marketplace workflows based on robotic process automation.

Figure 206:
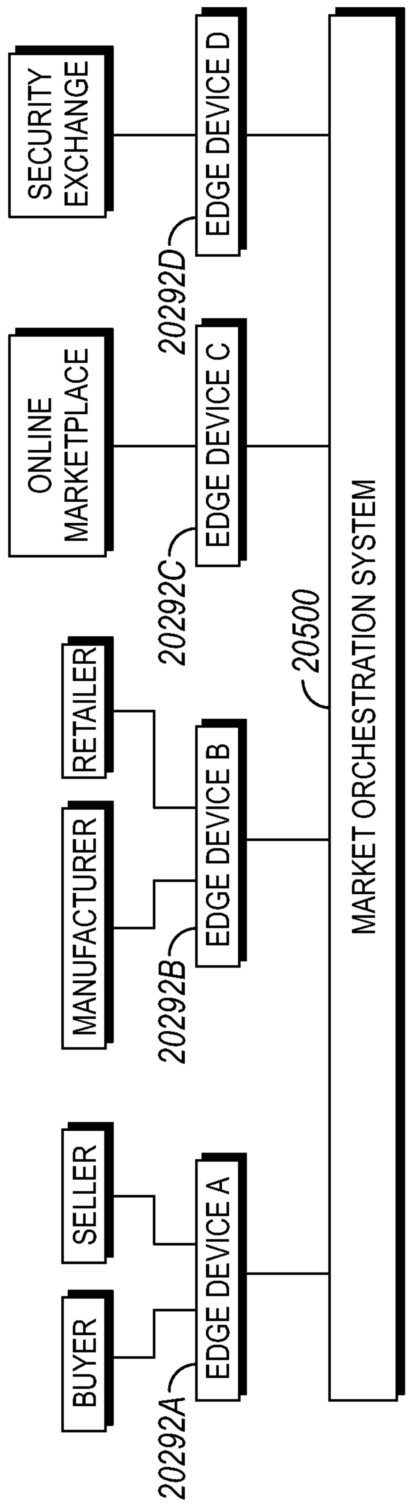

FIG. 206 is a schematic view of an exemplary embodiment of the market orchestration system including an edge device configured to perform edge computation and intelligence.

Figure 207:
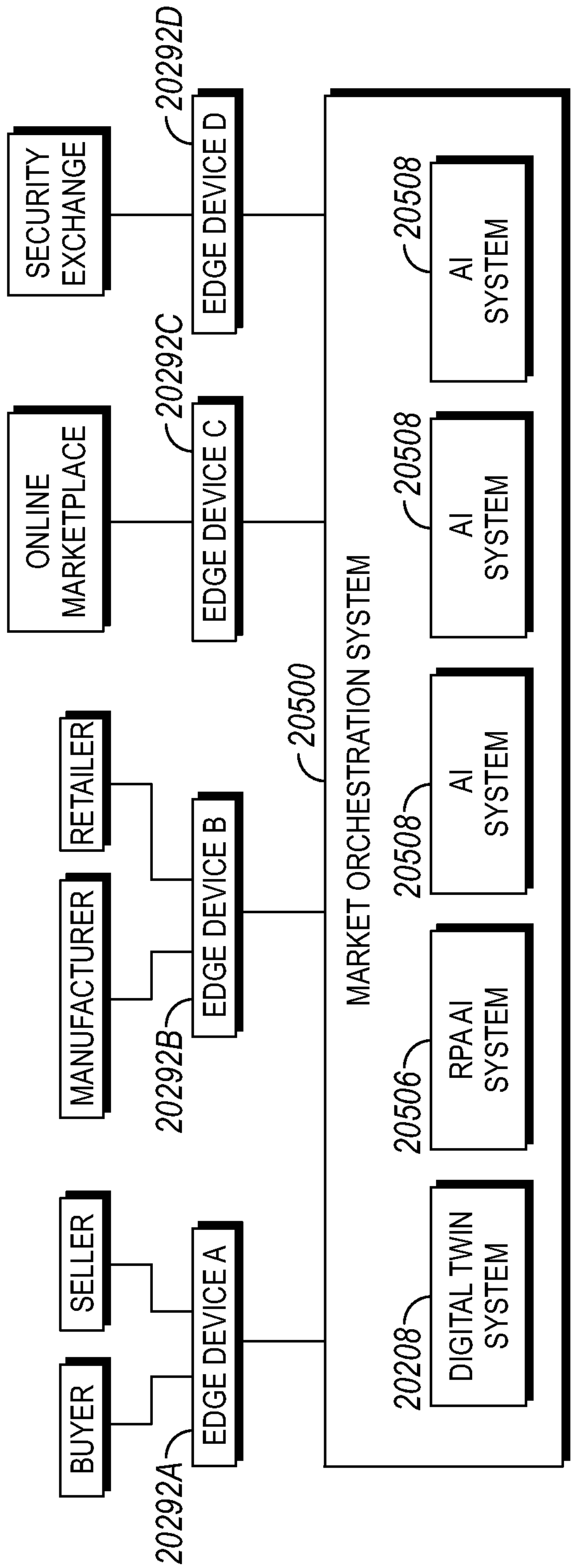

FIG. 207 is a schematic view of an exemplary embodiment of the market orchestration system including a digital twin system configured to integrate a set of adaptive edge computing systems with a market orchestration digital twin.

Figure 208:
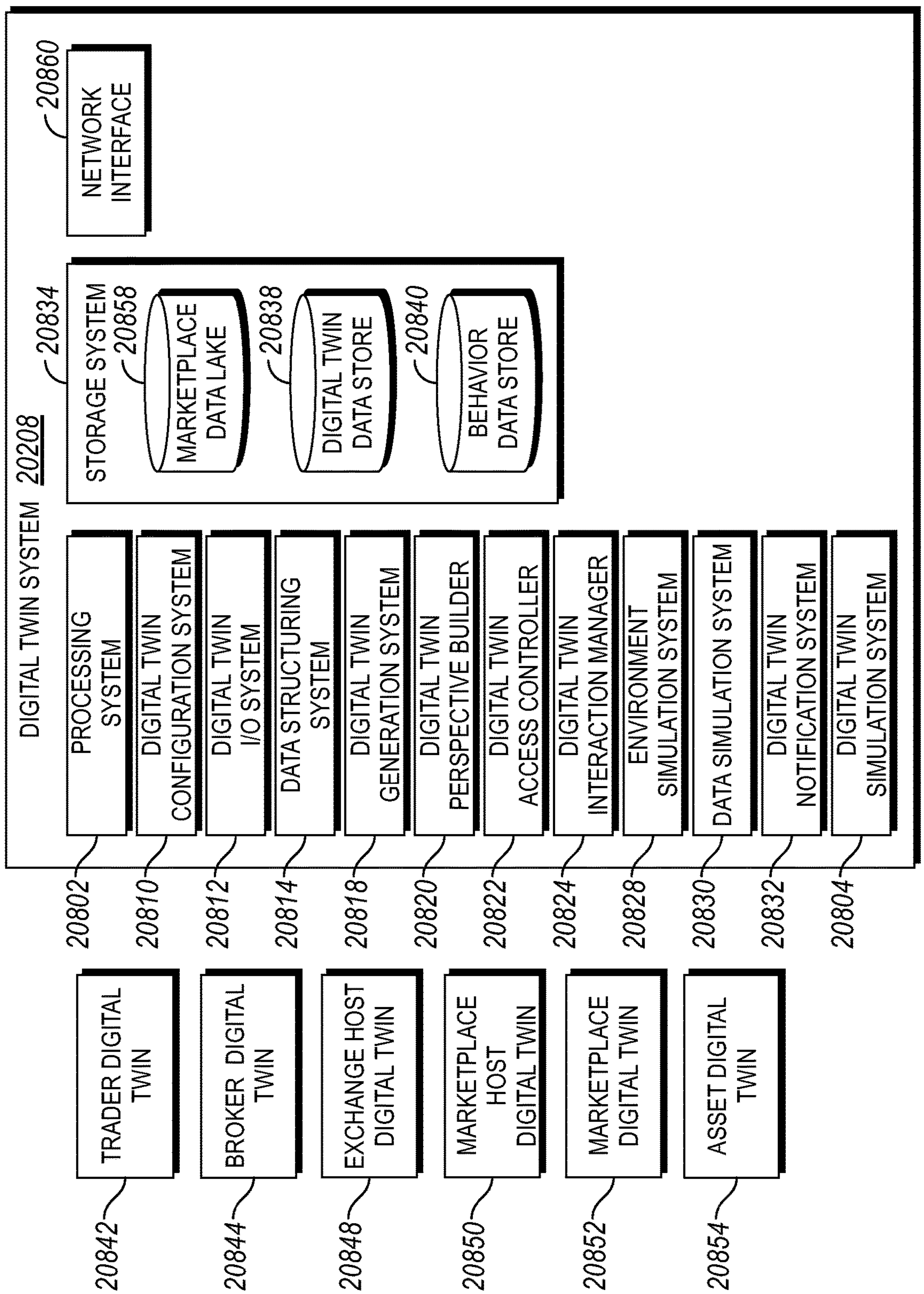

FIG. 208 is a schematic view of a digital twin system according to some embodiments.

Gaming Engine and Smart Contract Platform FIGS.

FIG. 209A, FIG. 209B, and FIG. 209C are a block diagrams depicting systems of a gaming engine smart contract executing platform in an exemplary deployment environment.

Figure 210:
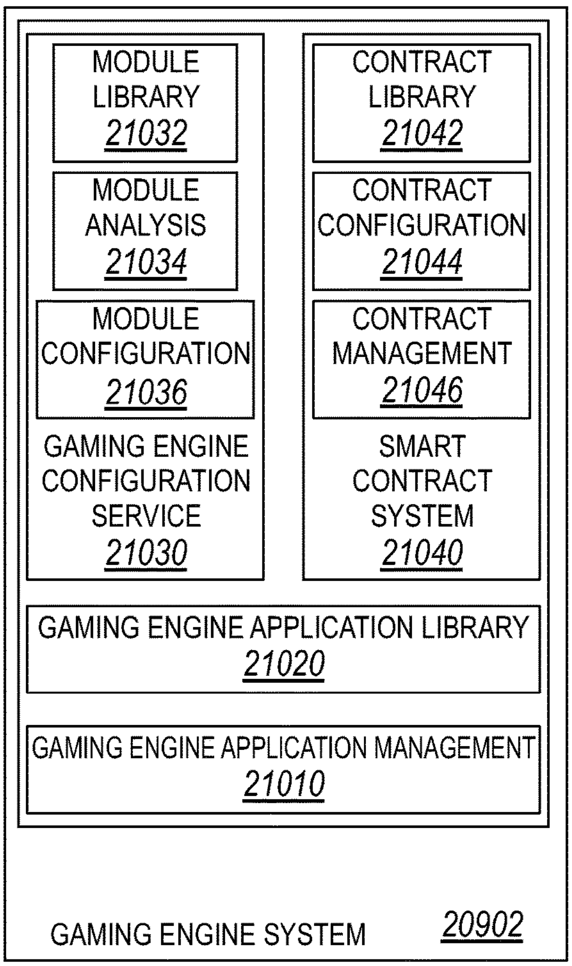

FIG. 210 is a block diagram depicting a gaming engine system of a gaming engine smart contract executing platform in an exemplary deployment environment.

Figure 211:
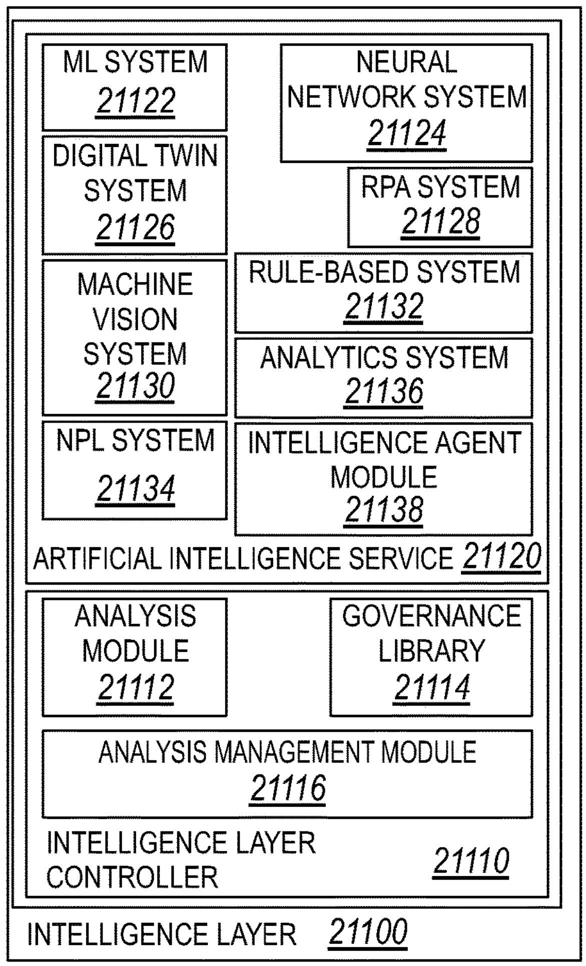

FIG. 211 is a block diagram depicting an intelligence layer of a gaming engine smart contract executing platform in an exemplary deployment environment.

Figure 212:
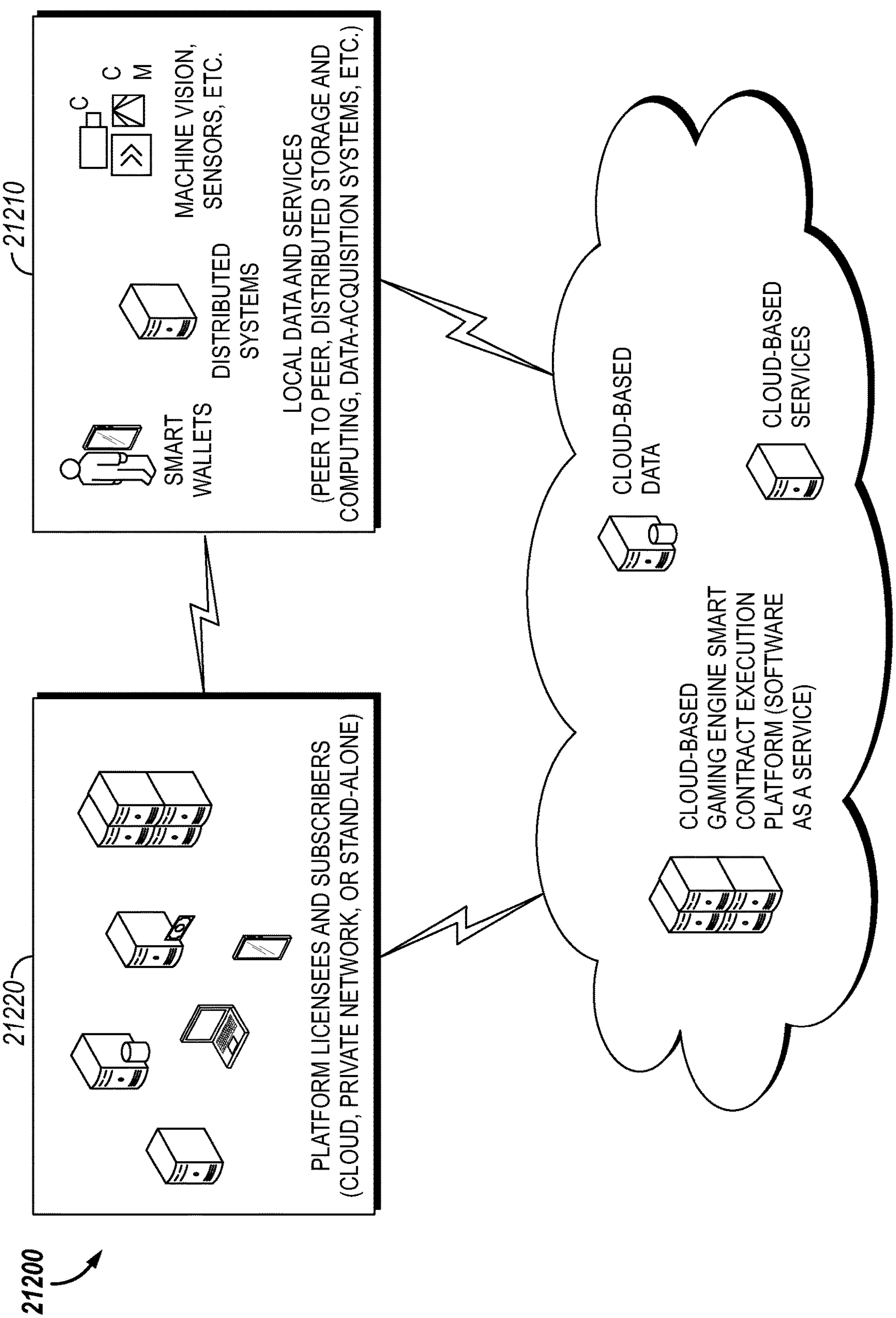

FIG. 212 is a block diagram depicting a cloud-based deployment of the gaming engine smart contract platform of FIGS. 209A-C.

Figure 213:
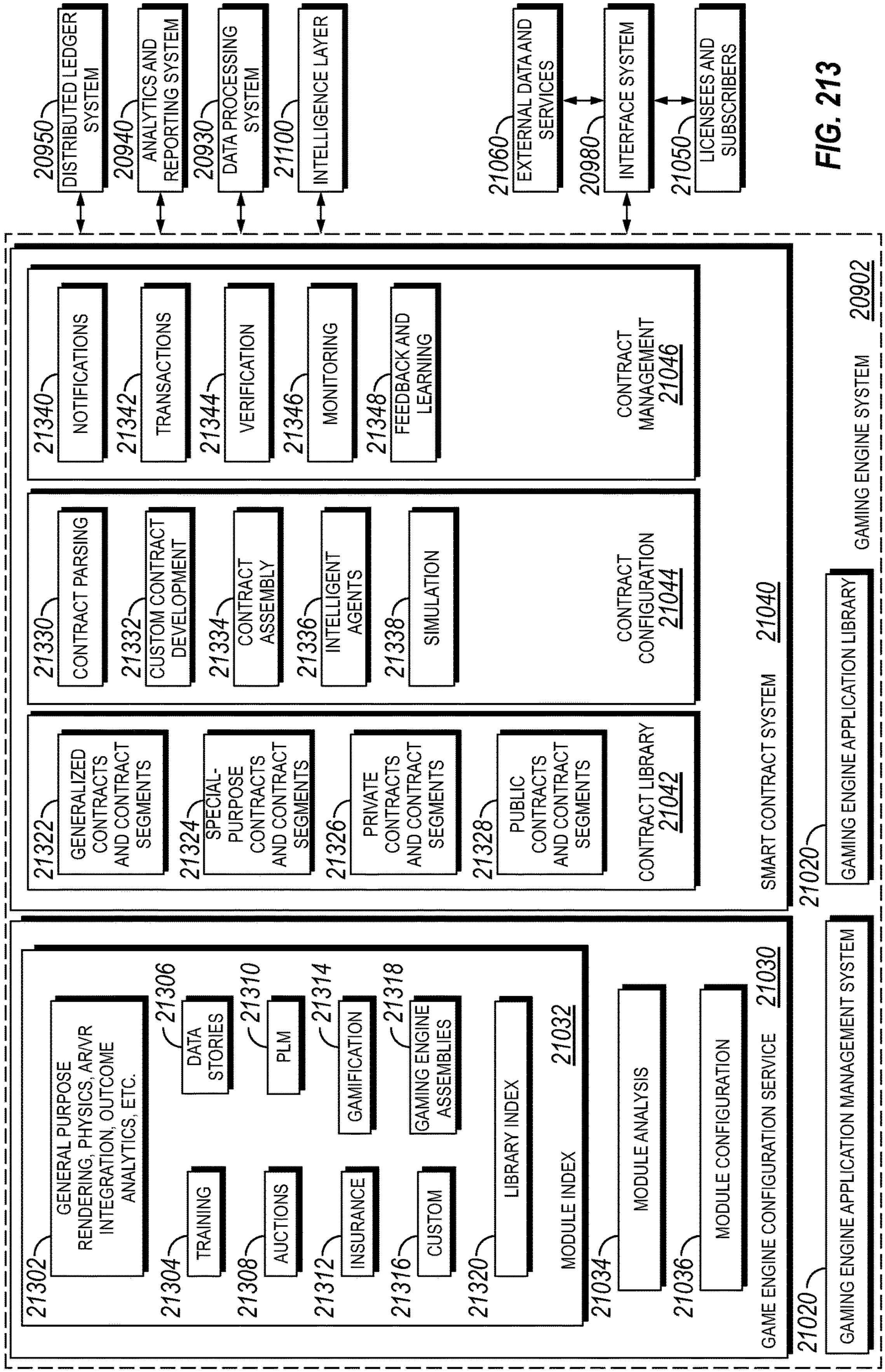

FIG. 213 is a block diagram depicting an exemplary embodiment of a gaming engine system of the gaming engine smart contract platform.

Figure 214:
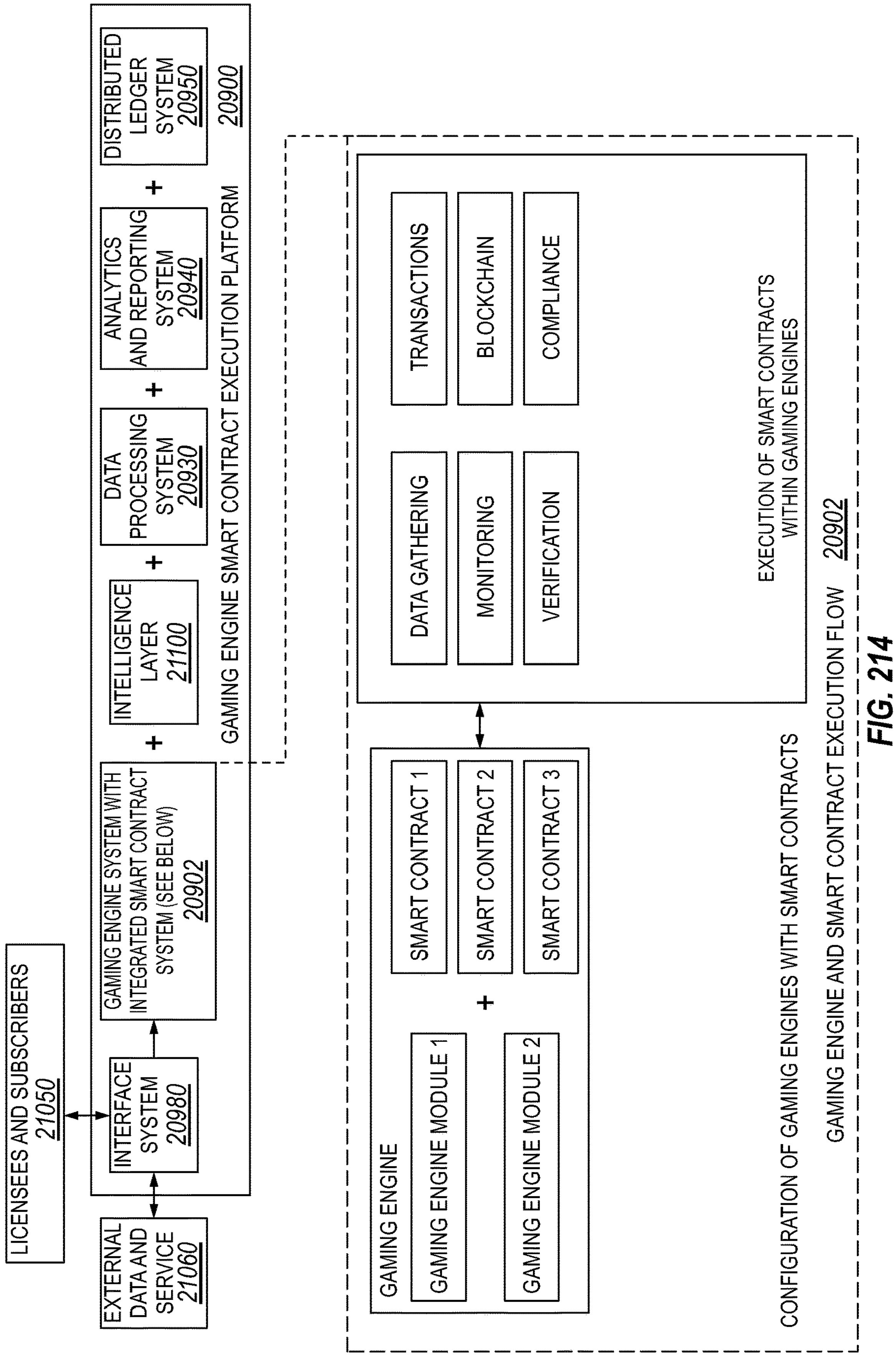

FIG. 214 is a flowchart depicting an exemplary execution flow of the gaming engine smart contract platform.

Figure 215:
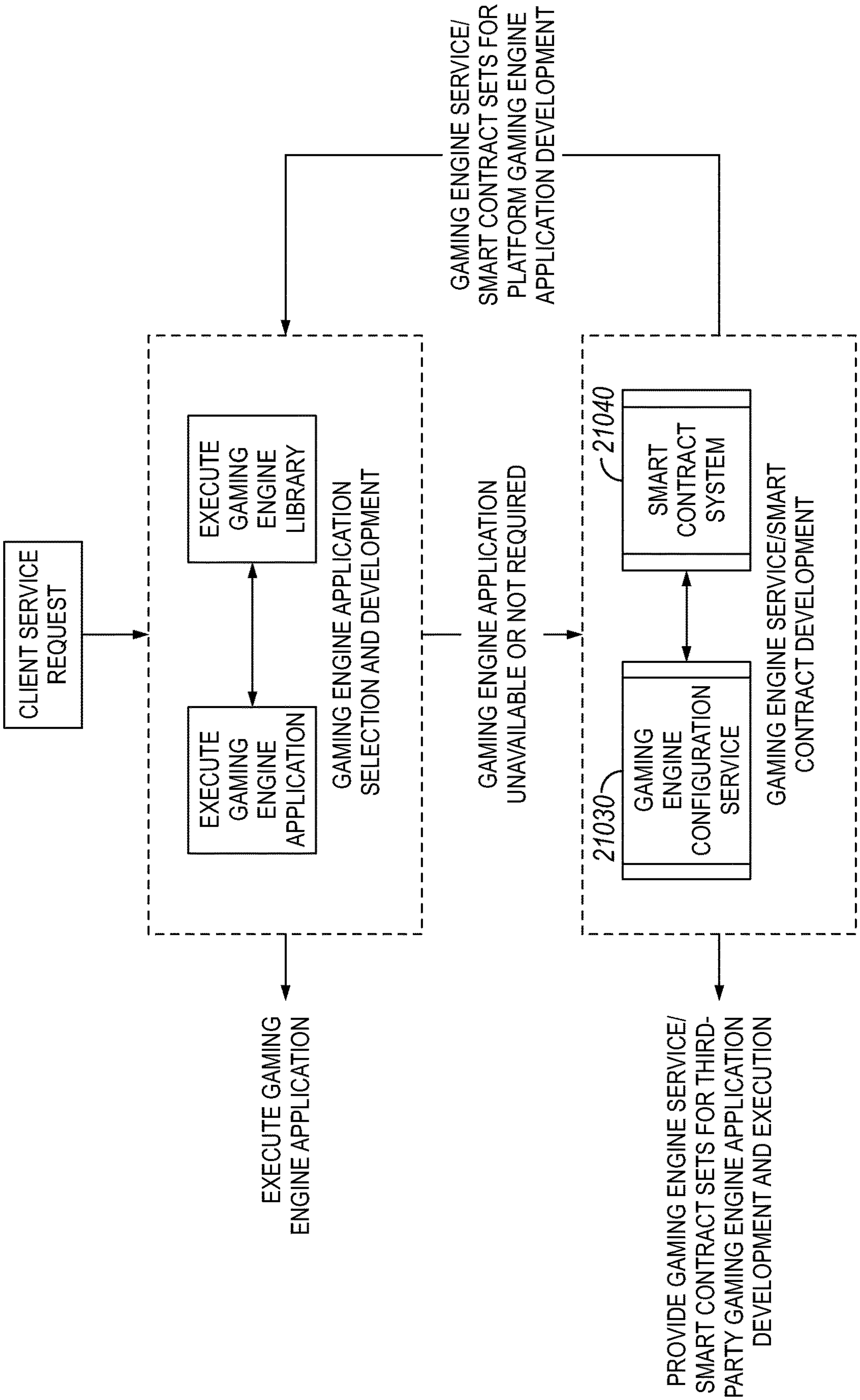

FIG. 215 is a flowchart depicting another exemplary execution flow of the gaming engine smart contract platform.

FIG. 216A and FIG. 216B are flowcharts depicting yet another exemplary execution flow of the gaming engine smart contract platform.

Figure 217:
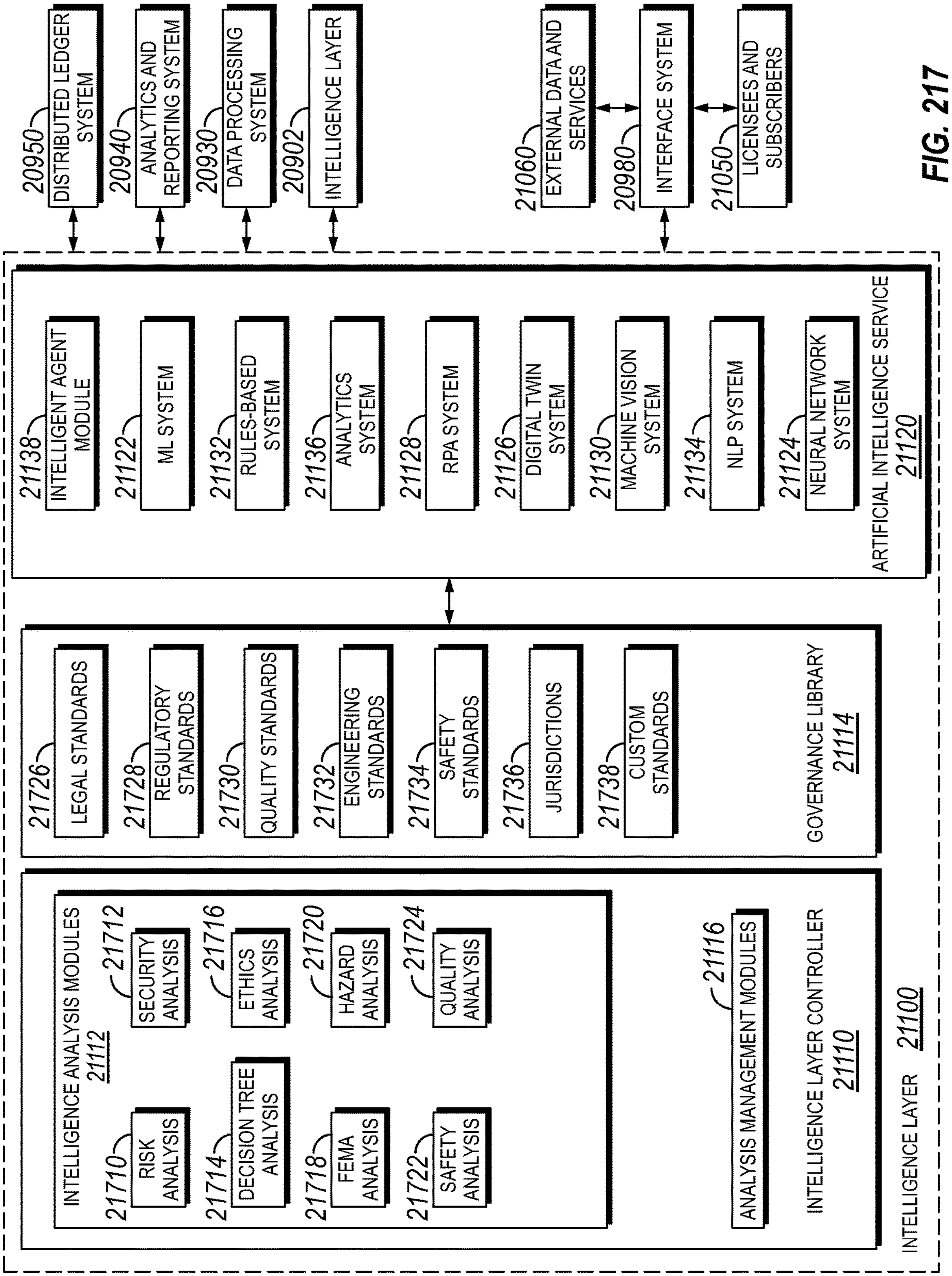

FIG. 217 is a block diagram depicting an exemplary embodiment of an intelligence layer of the gaming engine smart contract platform.

Figure 218:
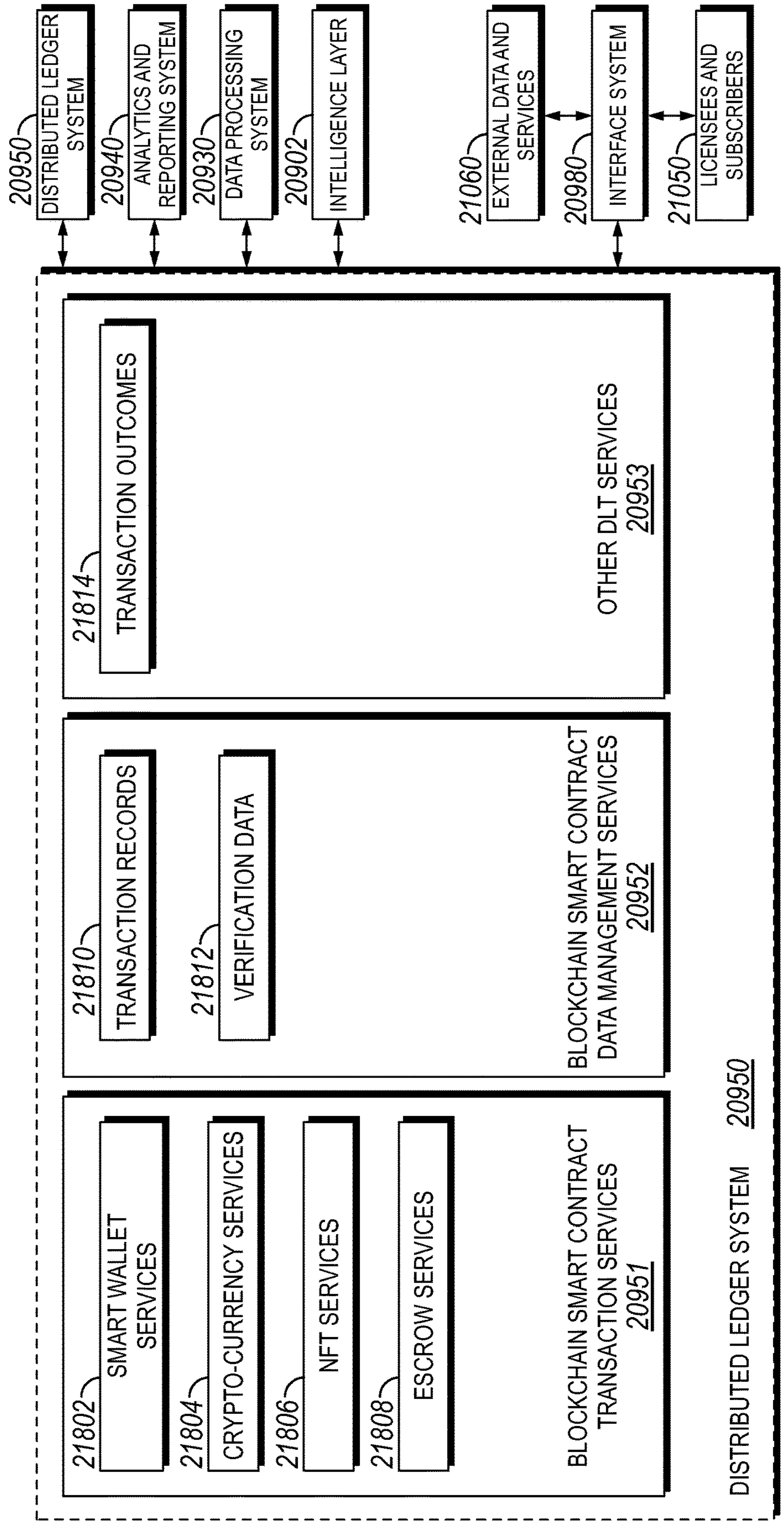

FIG. 218 is a block diagram depicting an exemplary embodiment of a distributed ledger system of the gaming engine smart contract platform.

Figure 219:
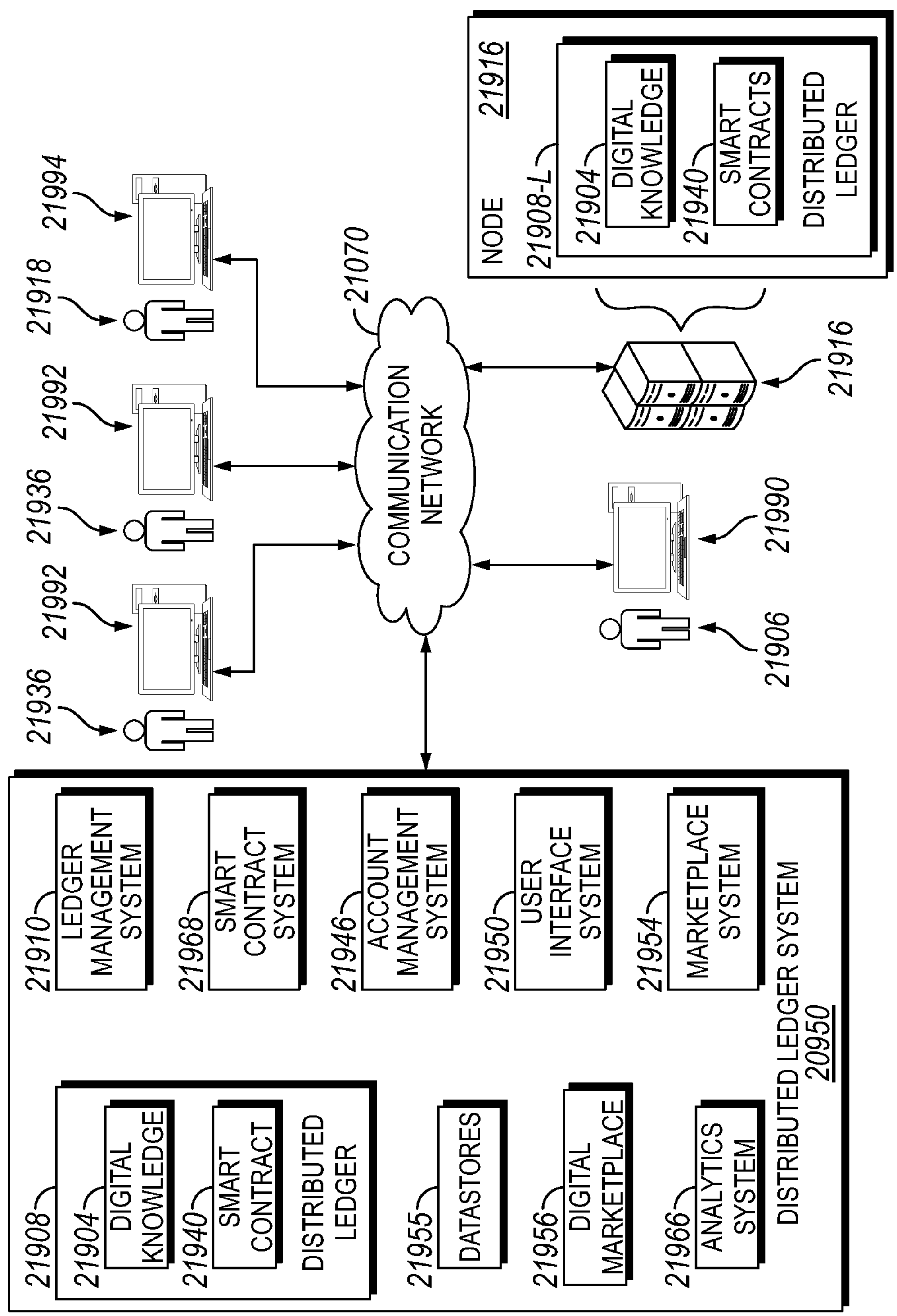

FIG. 219 is a block diagram depicting an exemplary embodiment of a distributed ledger network of the gaming engine smart contract platform.

Figure 220:
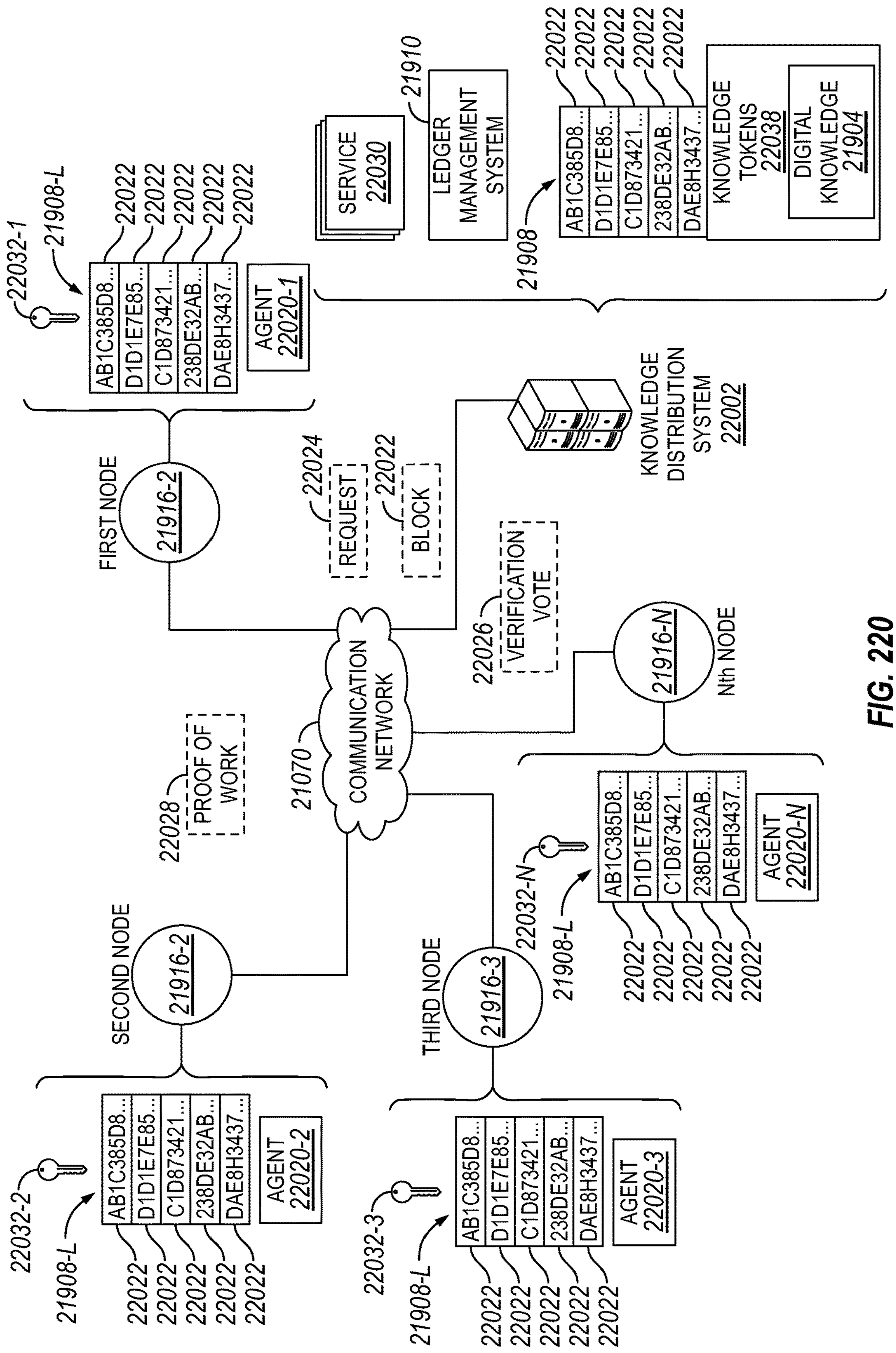

FIG. 220 is a block diagram depicting another exemplary embodiment of a distributed ledger network of the gaming engine smart contract platform.

Figure 221:
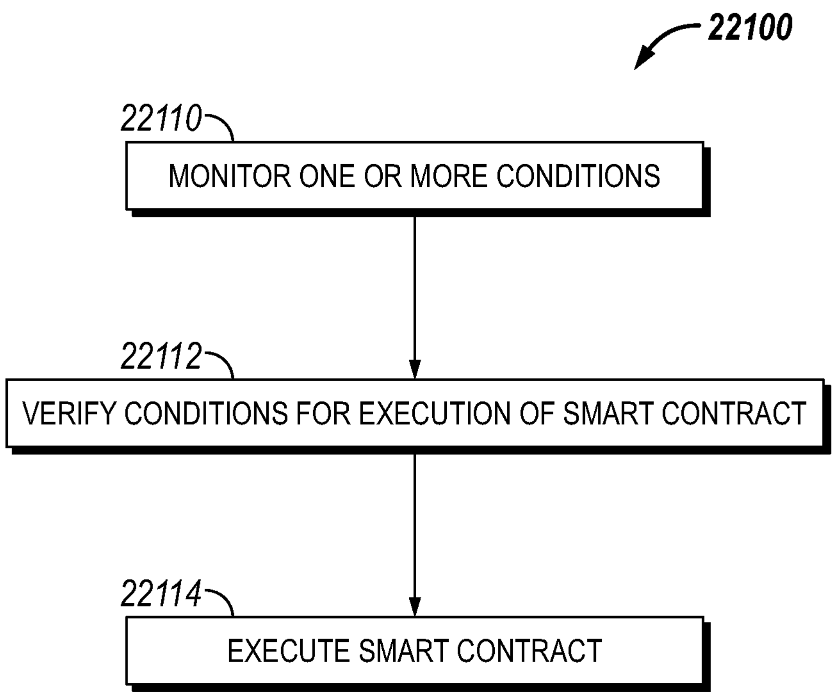

FIG. 221 is a flowchart depicting an exemplary method of executing a smart contract via the gaming engine smart contract platform.

Additive Manufacturing FIGS.

Figure 222:
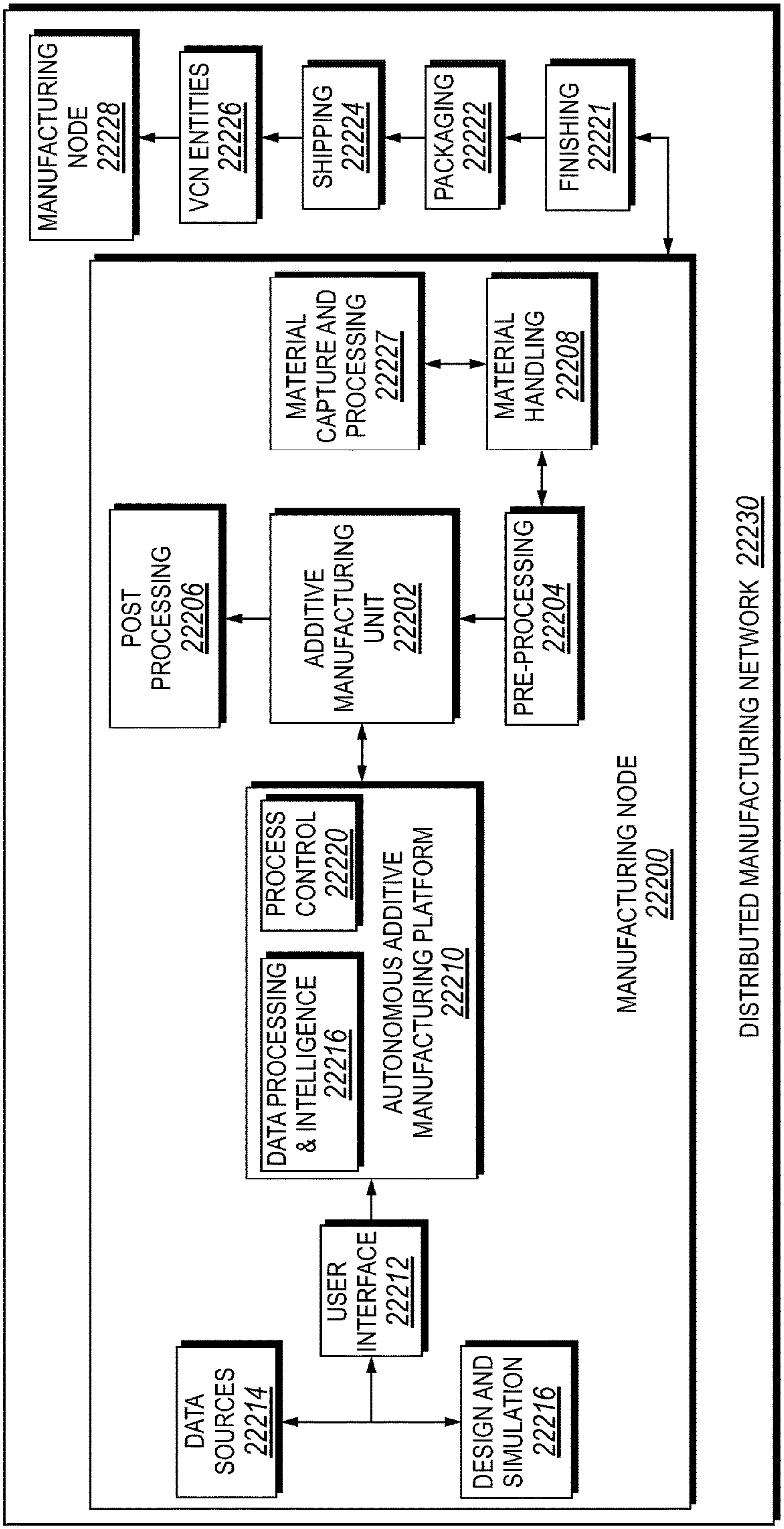

FIG. 222 is a diagrammatic view illustrating an example environment of an autonomous additive manufacturing platform according to some embodiments of the present disclosure.

Figure 223:
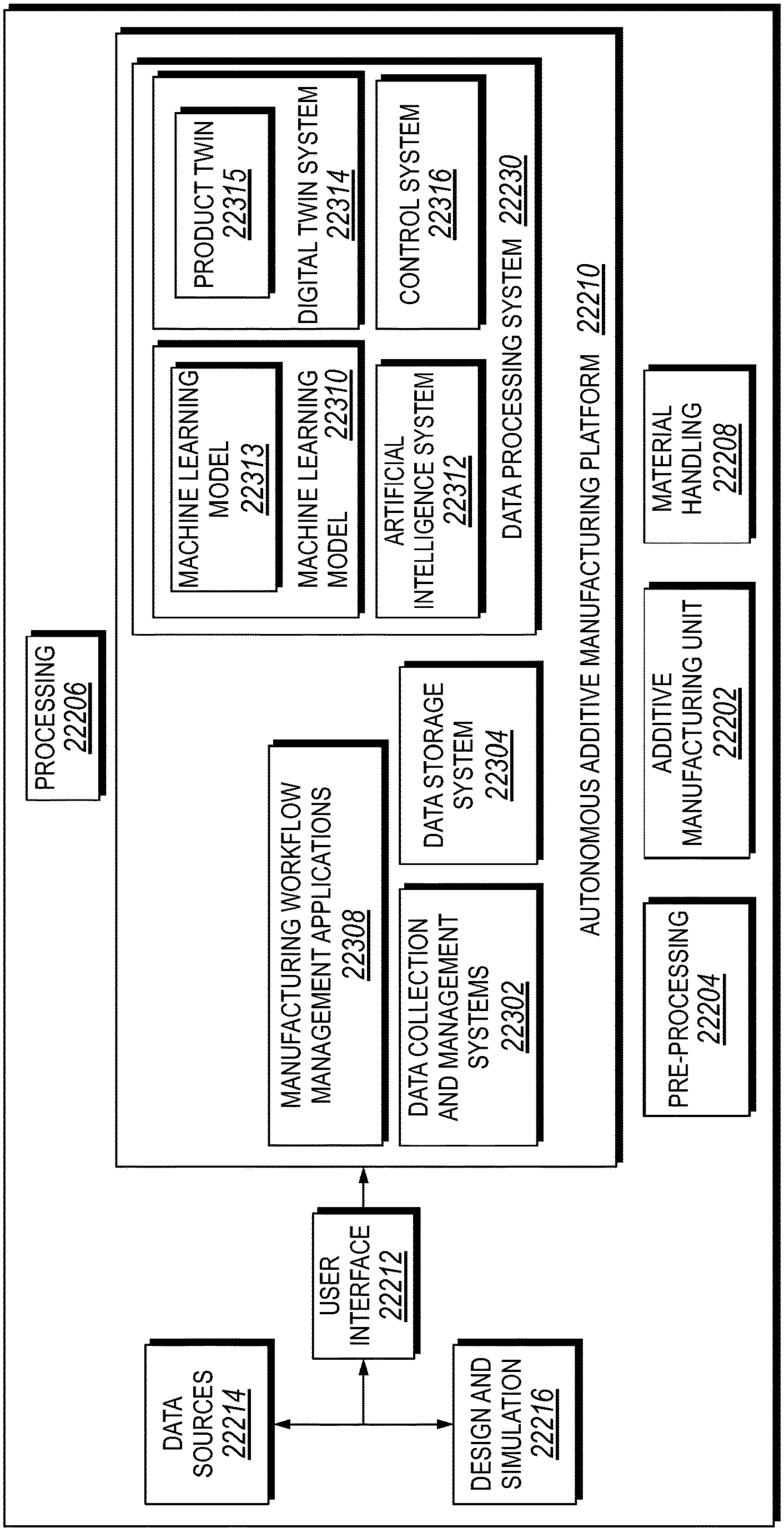

FIG. 223 is a schematic illustrating an example implementation of an autonomous additive manufacturing platform for automating and optimizing the digital production workflow for metal additive manufacturing according to some embodiments of the present disclosure.

Figure 224:
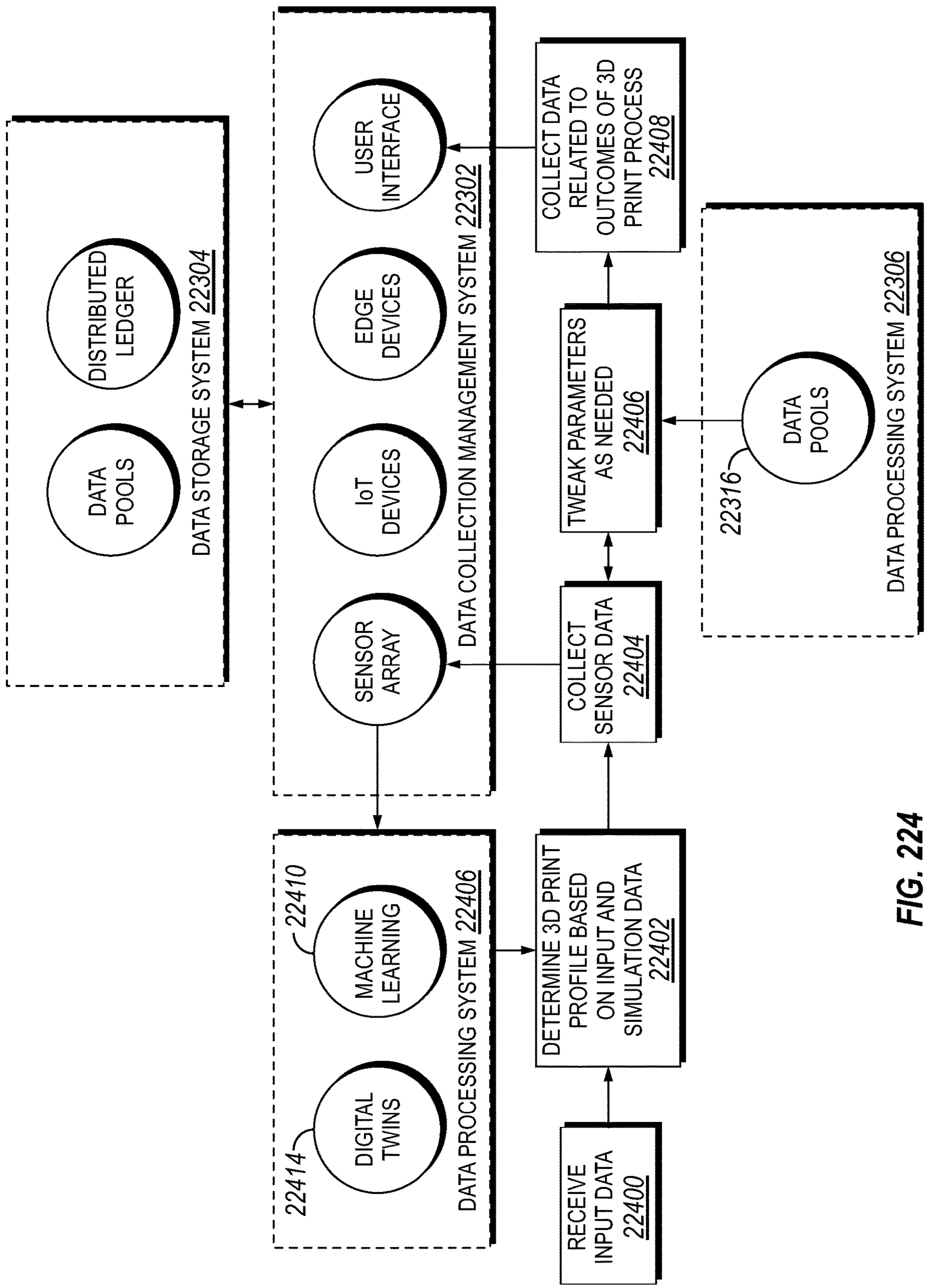

FIG. 224 is a flow diagram illustrating the optimization of different parameters of an additive manufacture process according to some embodiments of the present disclosure.

Figure 225A:
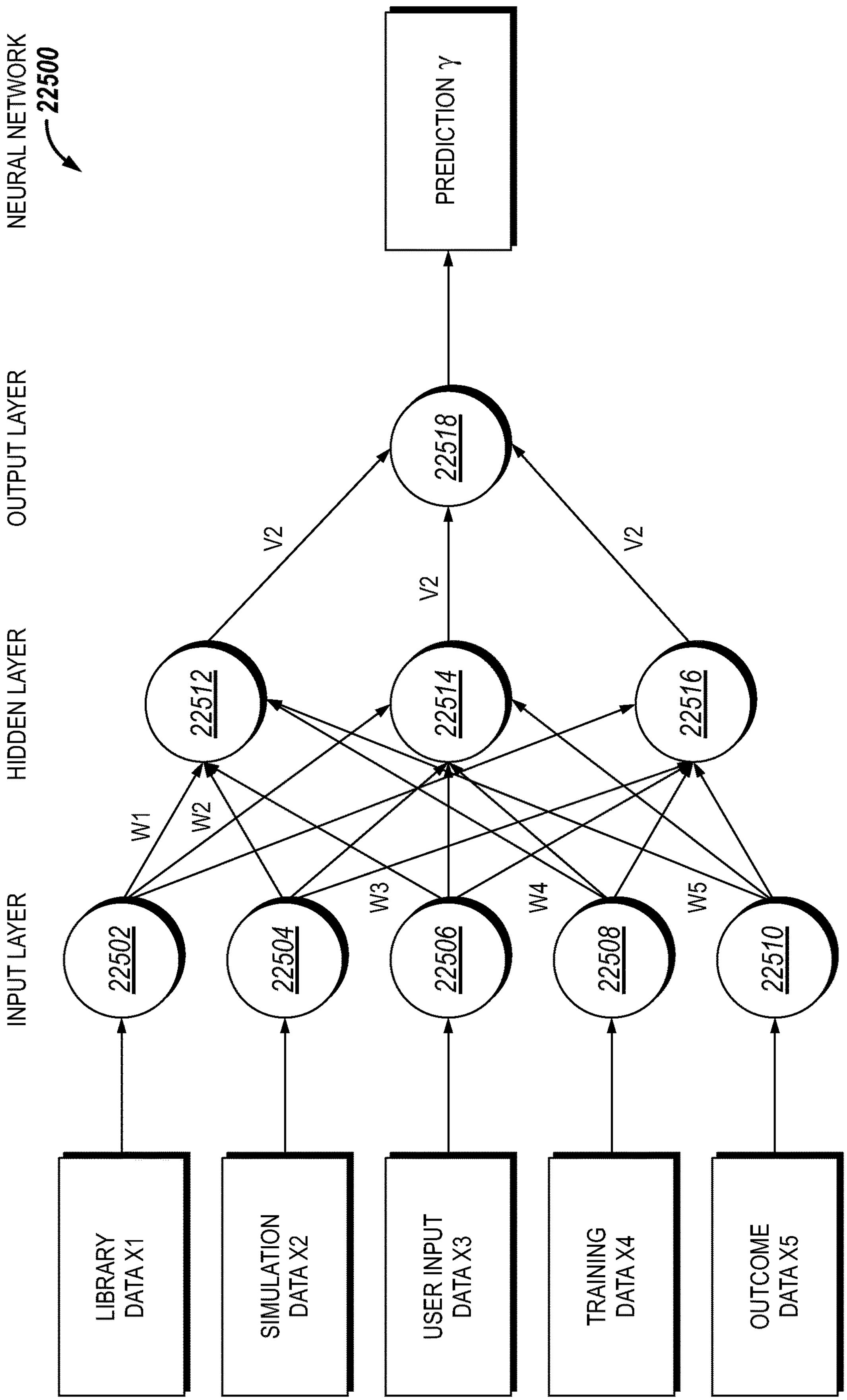

FIG. 225A is a schematic illustrating an example artificial neural network used to provide real-time, adaptive control of an additive manufacturing process according to some embodiments of the present disclosure.

Figure 225B:
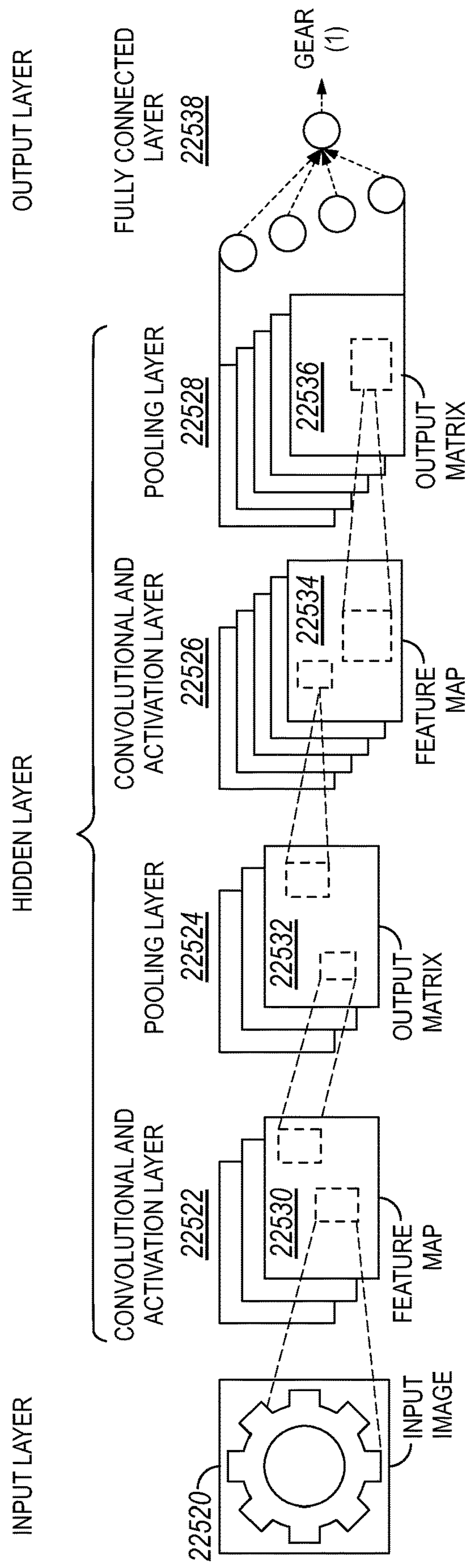

FIG. 225B is a diagrammatic view illustrating an example implementation of a data processing system using a convolutional neural network (CNN) to provide automatic classification and clustering of parts and defects in an additive manufacturing process according to some embodiments of the present disclosure.

Figure 226:
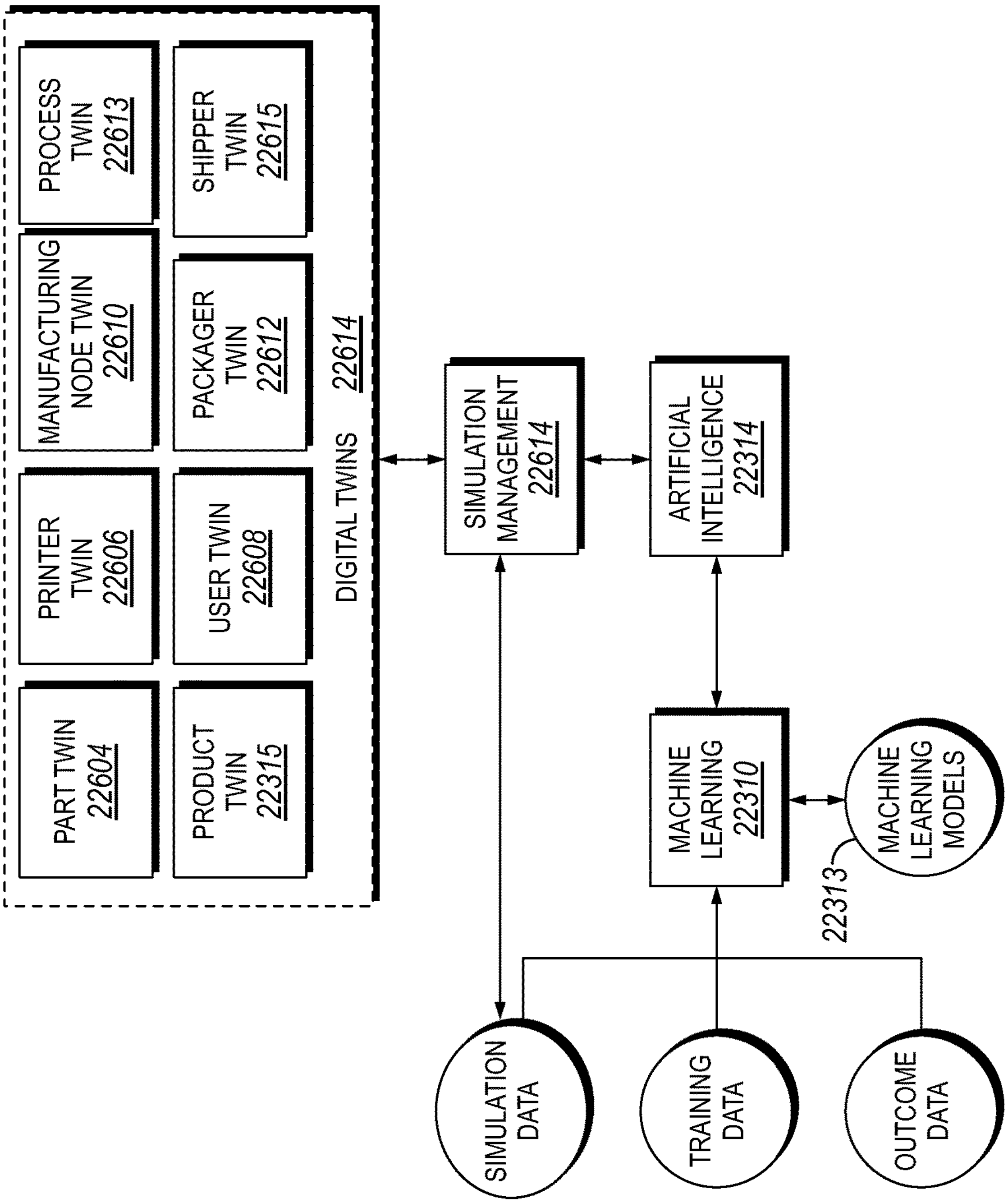

FIG. 226 is a schematic view illustrating a system for learning on data from an autonomous additive manufacturing platform to train an artificial learning system to use digital twins for classification, predictions and decision making according to some embodiments of the present disclosure.

FIG. 227A, FIG. 227B, and FIG. 227C are schematics illustrating an example implementation of an autonomous additive manufacturing platform including various components along with other entities of a distributed manufacturing network according to some embodiments of the present disclosure.

Figure 228:
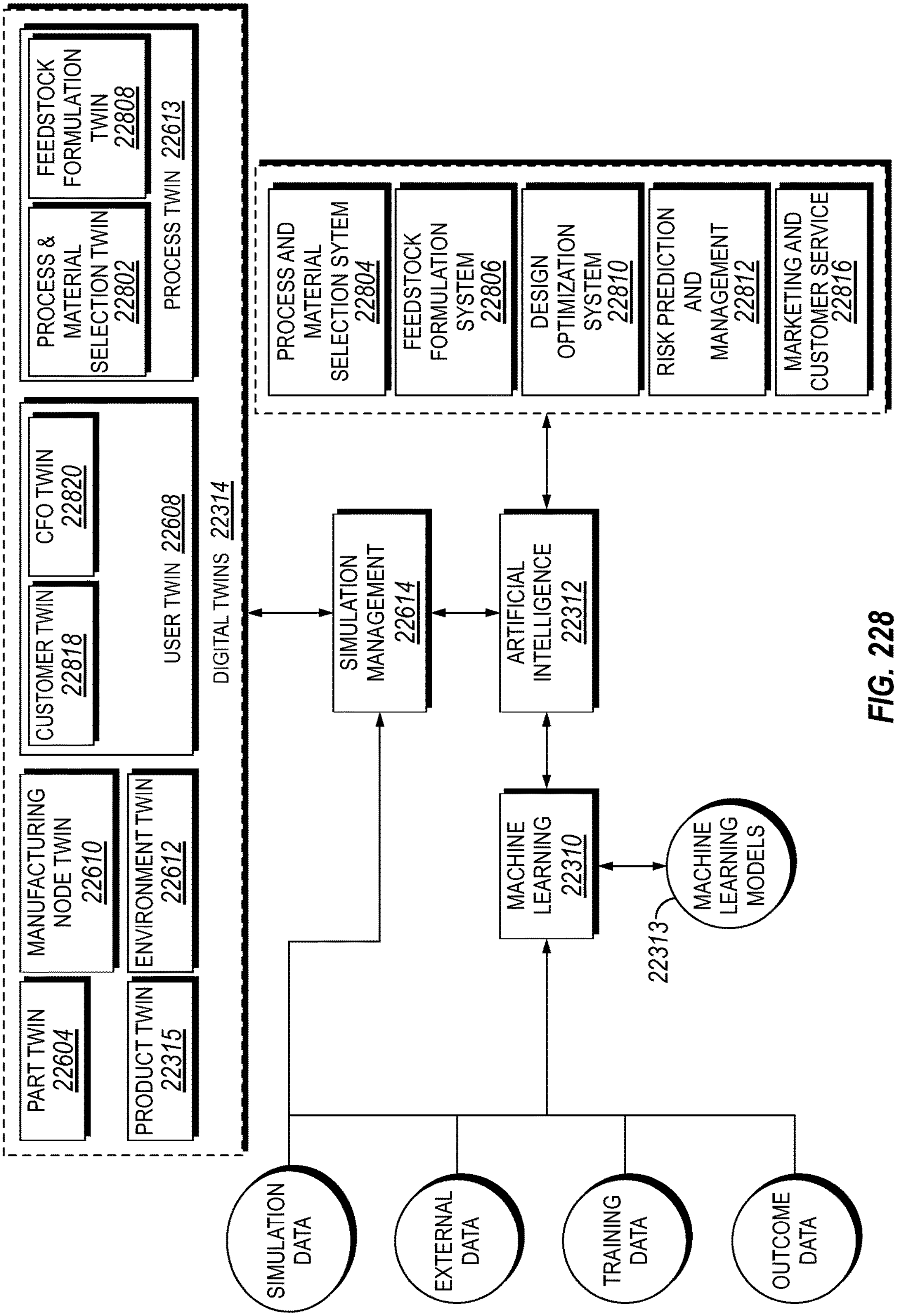

FIG. 228 is a schematic illustrating an example implementation of an autonomous additive manufacturing platform for automating and managing manufacturing functions and sub-processes including process and material selection, hybrid part workflows, feedstock formulation, part design optimization, risk prediction and management, marketing and customer service according to some embodiments of the present disclosure.

Figure 229:
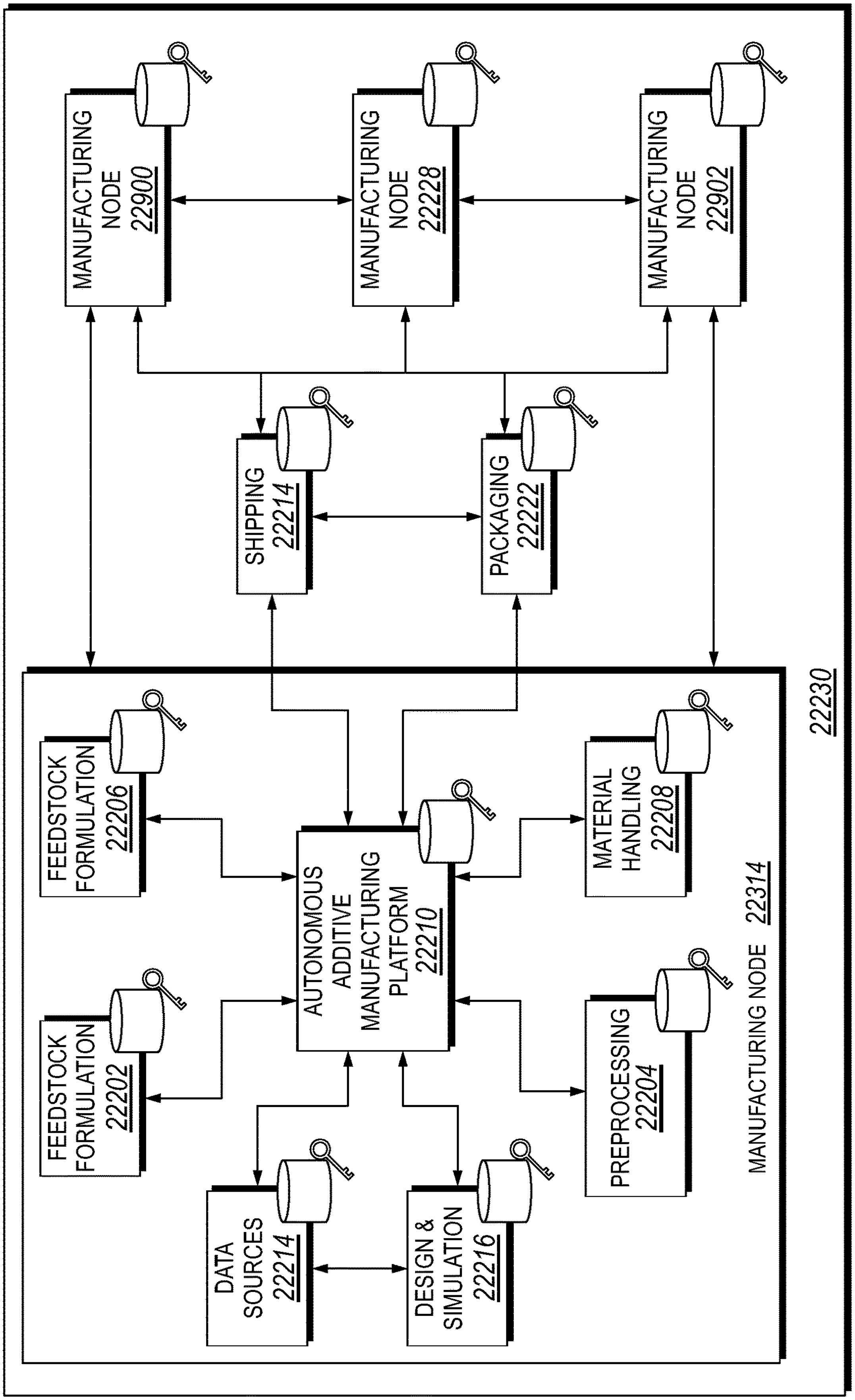

FIG. 229 is a diagrammatic view of a distributed manufacturing network enabled by an autonomous additive manufacturing platform and built on a distributed ledger system according to some embodiments of the present disclosure.

Figure 230:
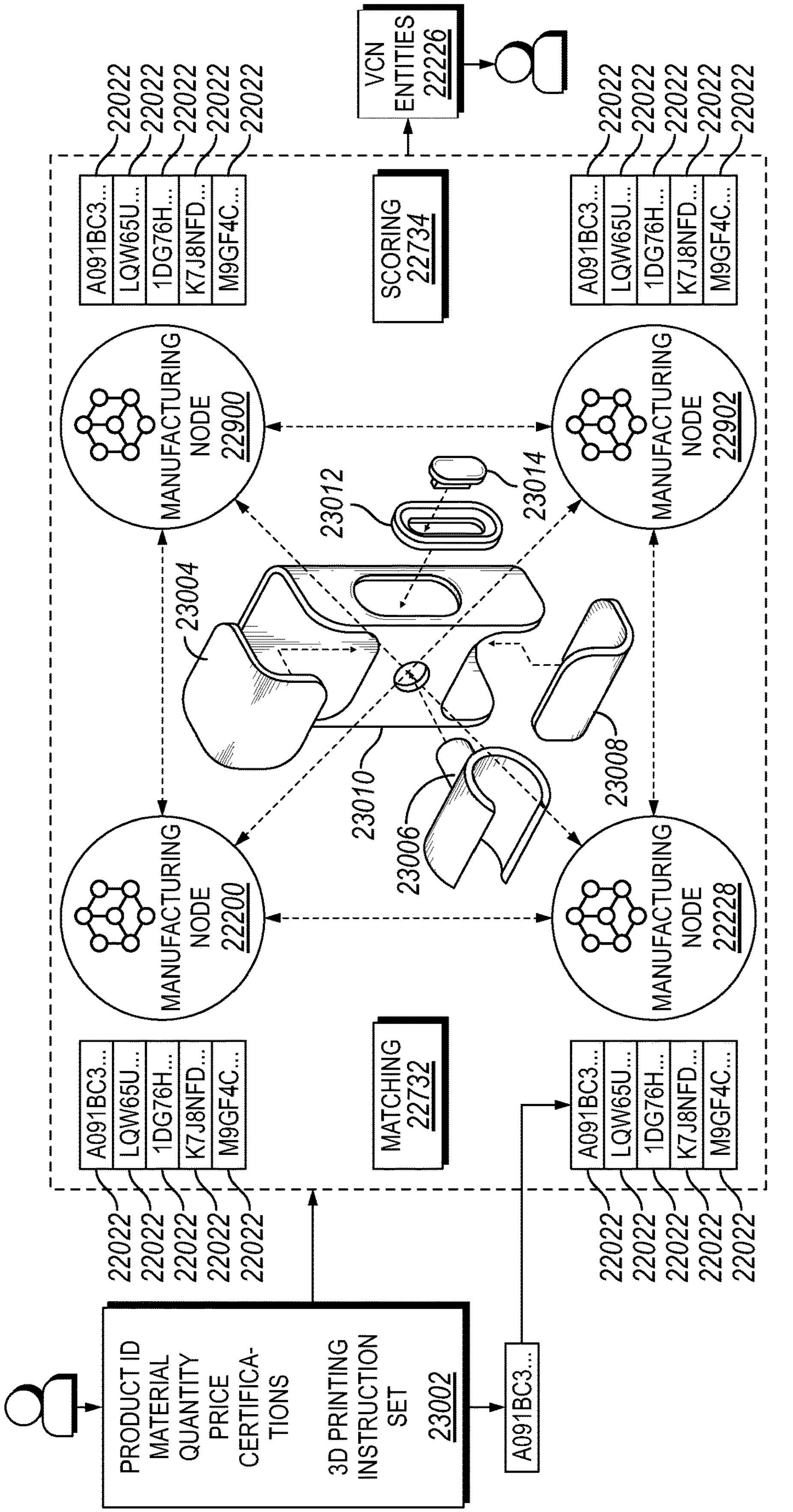

FIG. 230 is a schematic illustrating an example implementation of a distributed manufacturing network where the digital thread data is tokenized and stored in a distributed ledger so as to ensure traceability of parts printed at one or more manufacturing nodes in the distributed manufacturing network according to some embodiments of the present disclosure.

Enterprise Access Layer FIGS.

Figure 231:
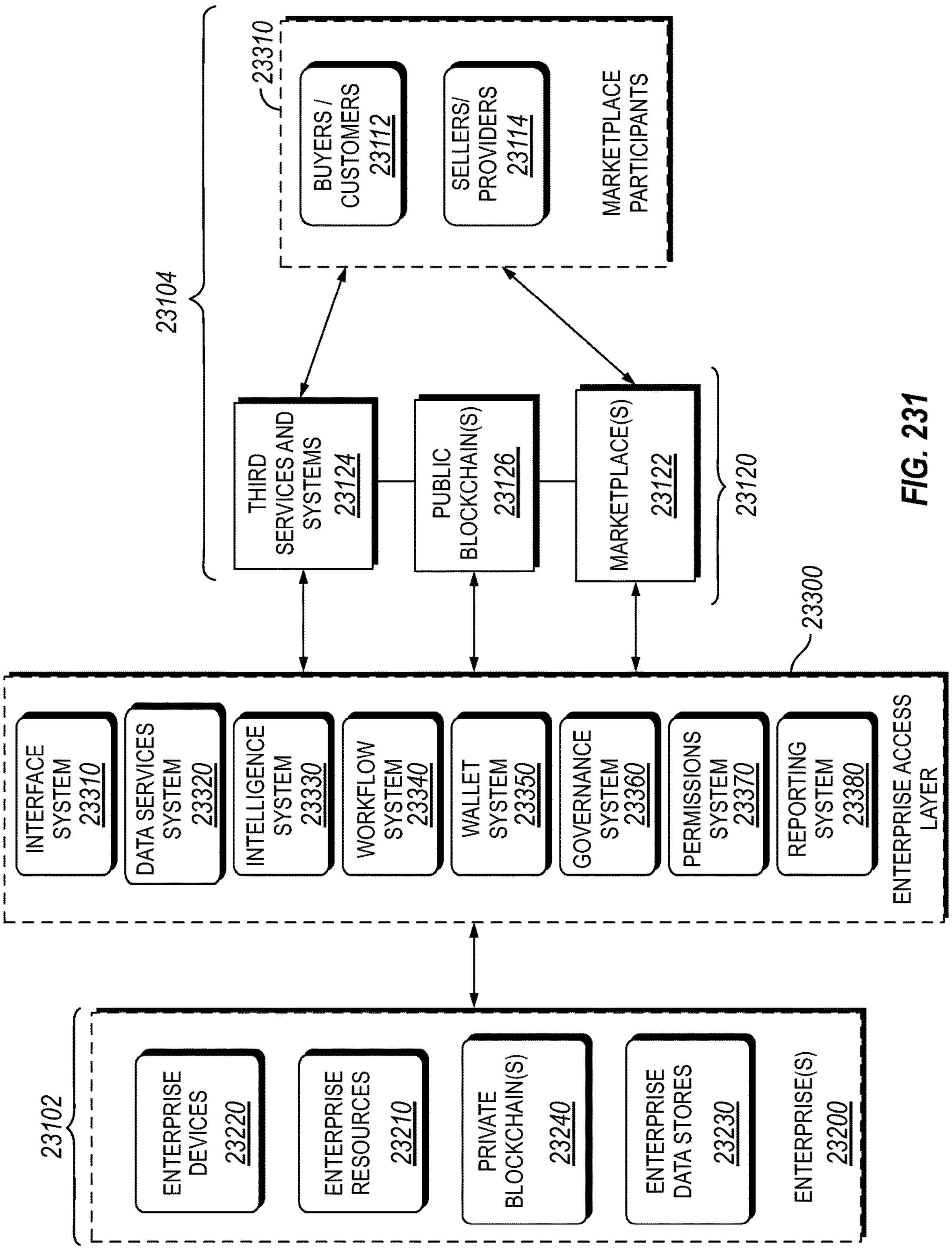

FIG. 231 is a schematic view of an example of an enterprise ecosystem having an enterprise access layer.

Figure 232:
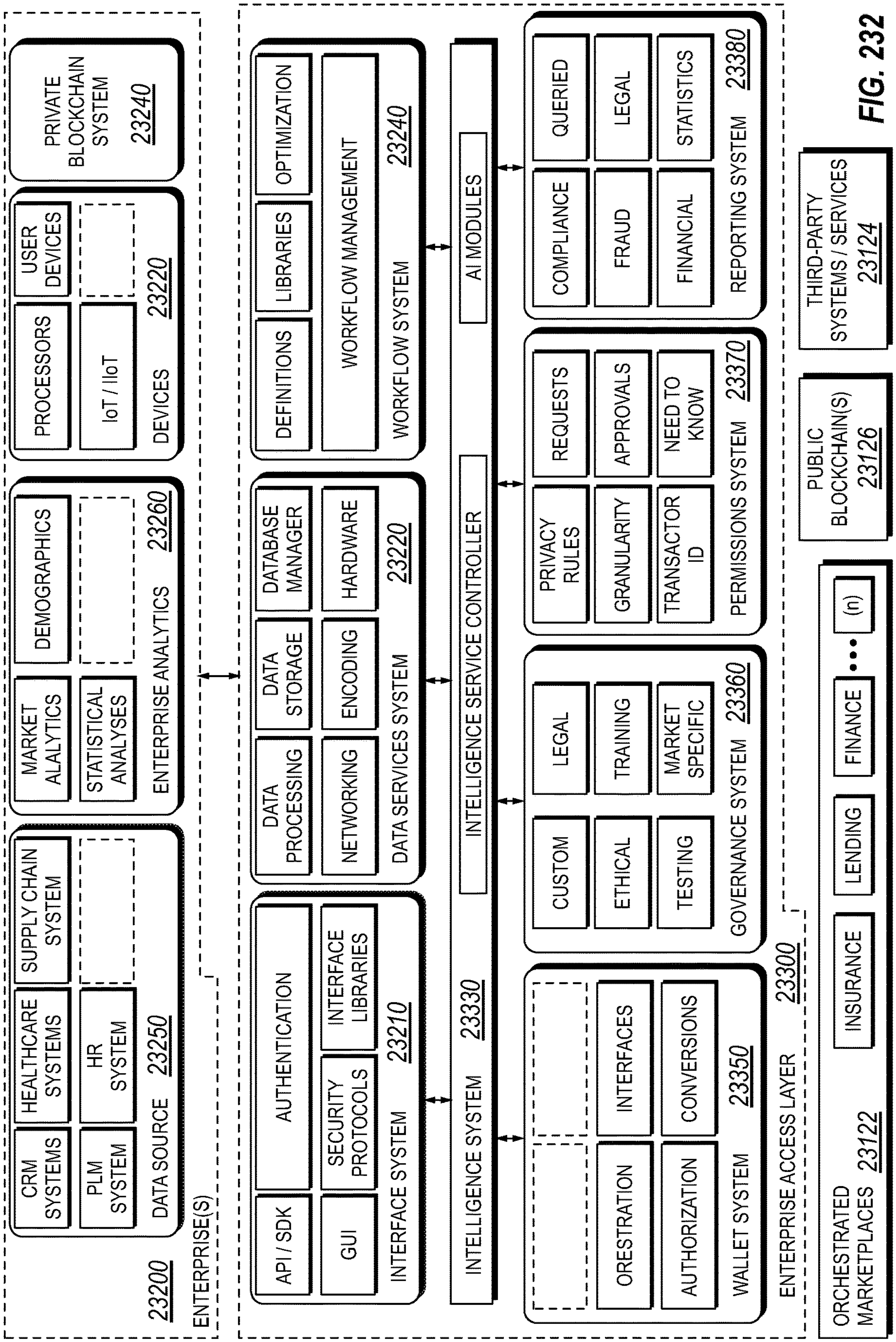

FIG. 232 is a schematic view of another example of an enterprise ecosystem having an enterprise access layer.

Figure 233:
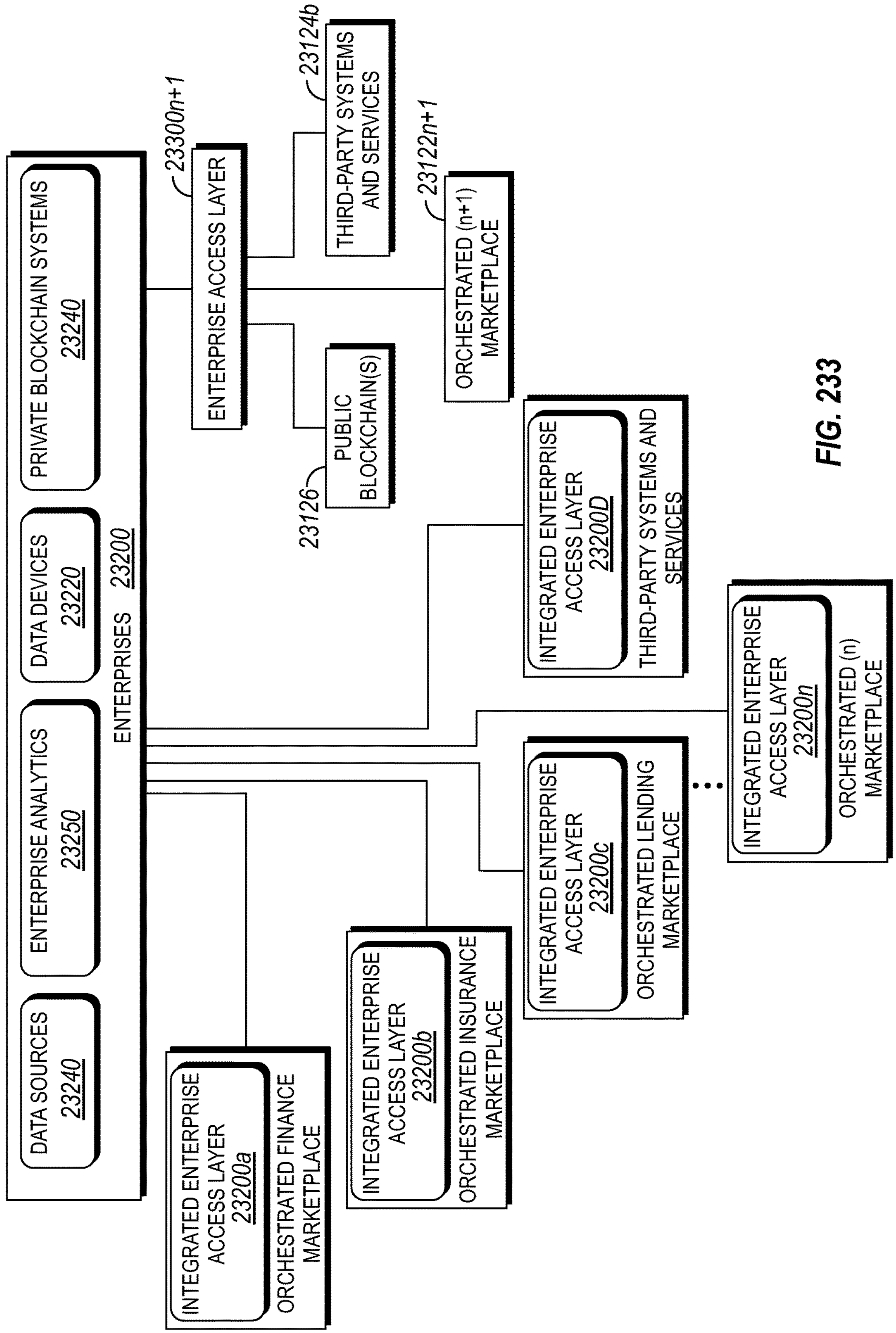

FIG. 233 is a schematic view of examples as to how the enterprise access layer of FIG. 232 may be integrated with portions of an enterprise ecosystem.

Figure 234:
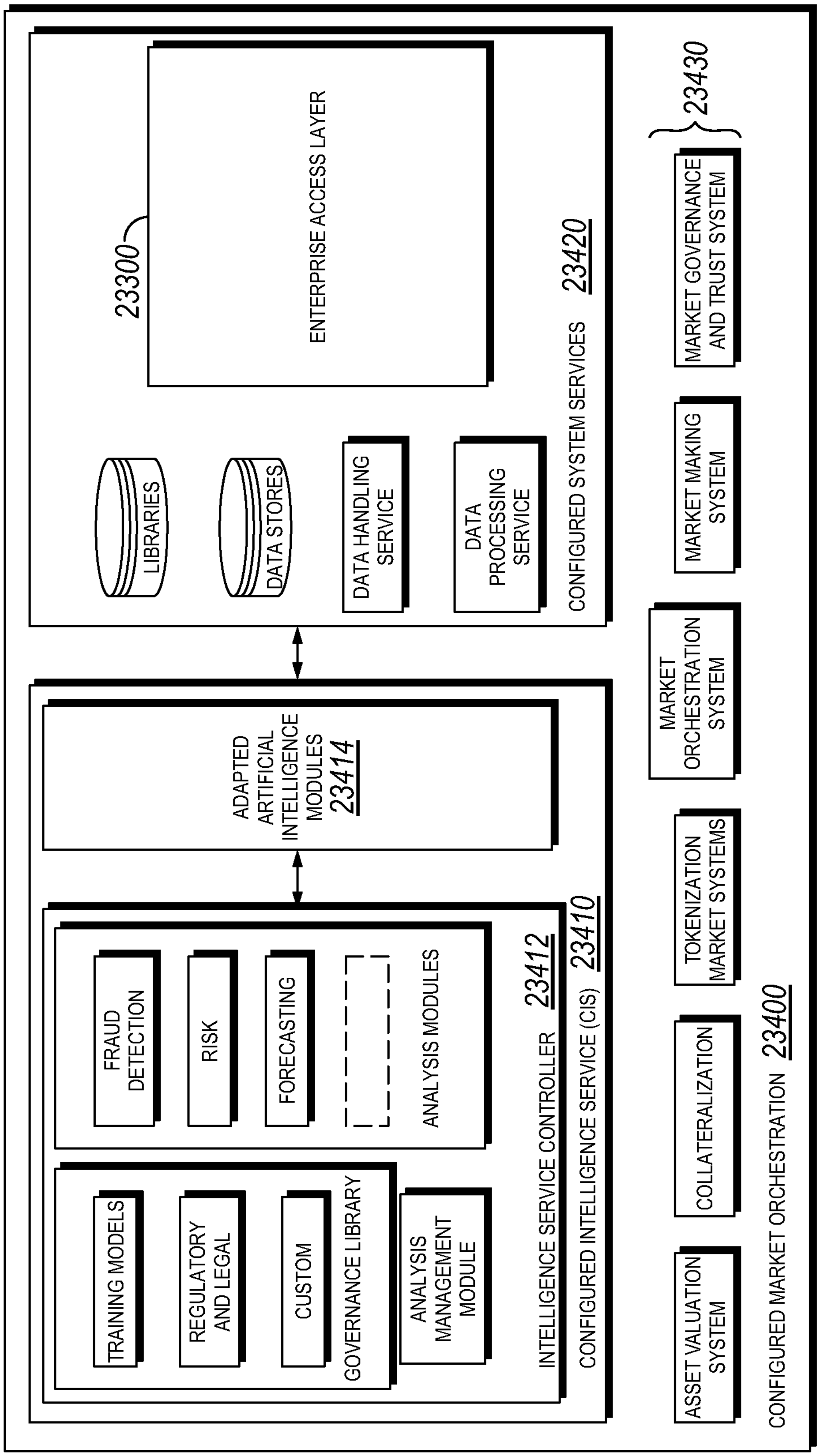

FIG. 234 is a schematic view of an example market orchestration system that includes an enterprise access layer.

Intelligence Services System FIGS.

Figure 235:
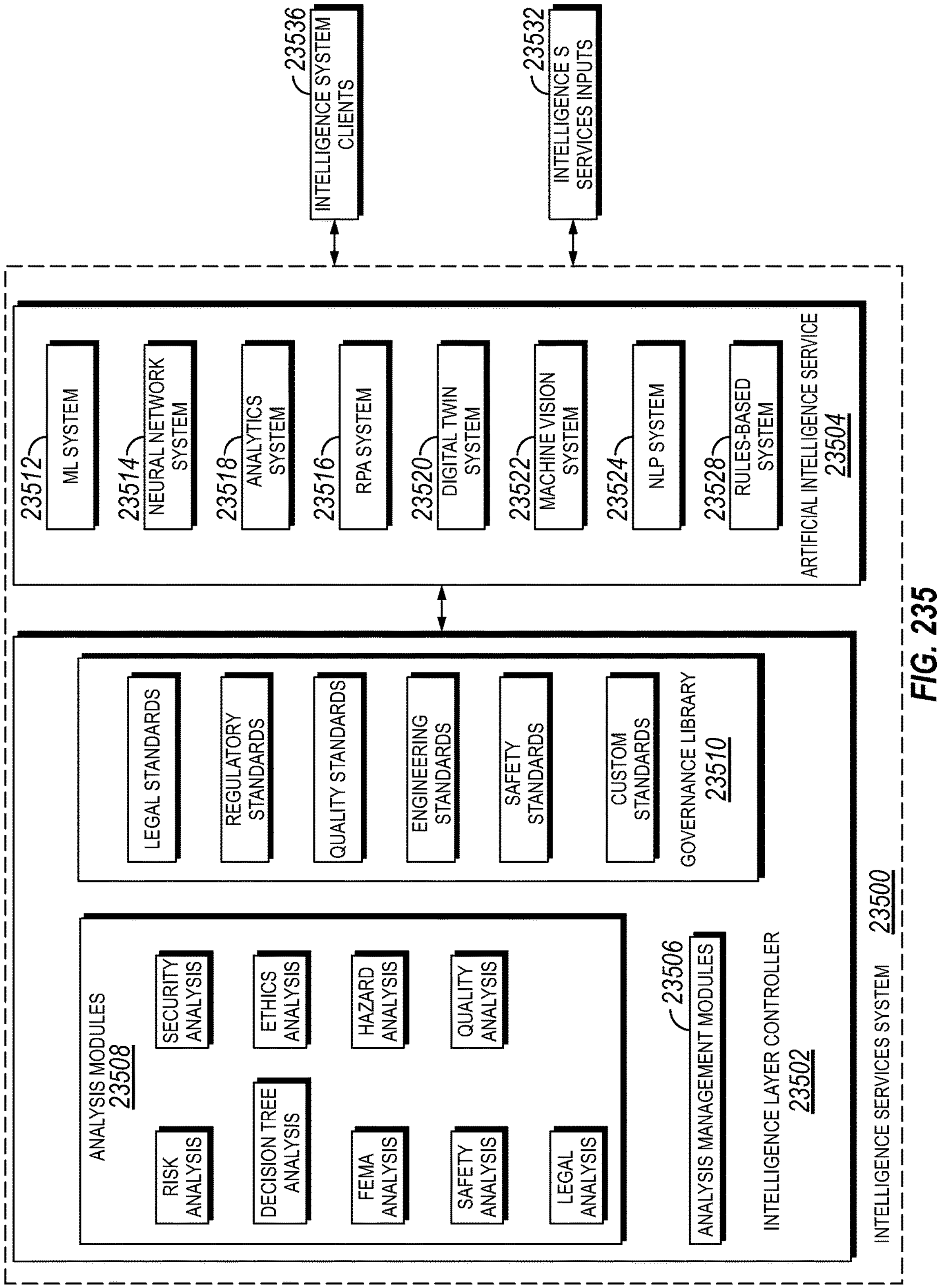

FIG. 235 is a schematic view of an example of an intelligence services system according to some embodiments.

Figure 236:
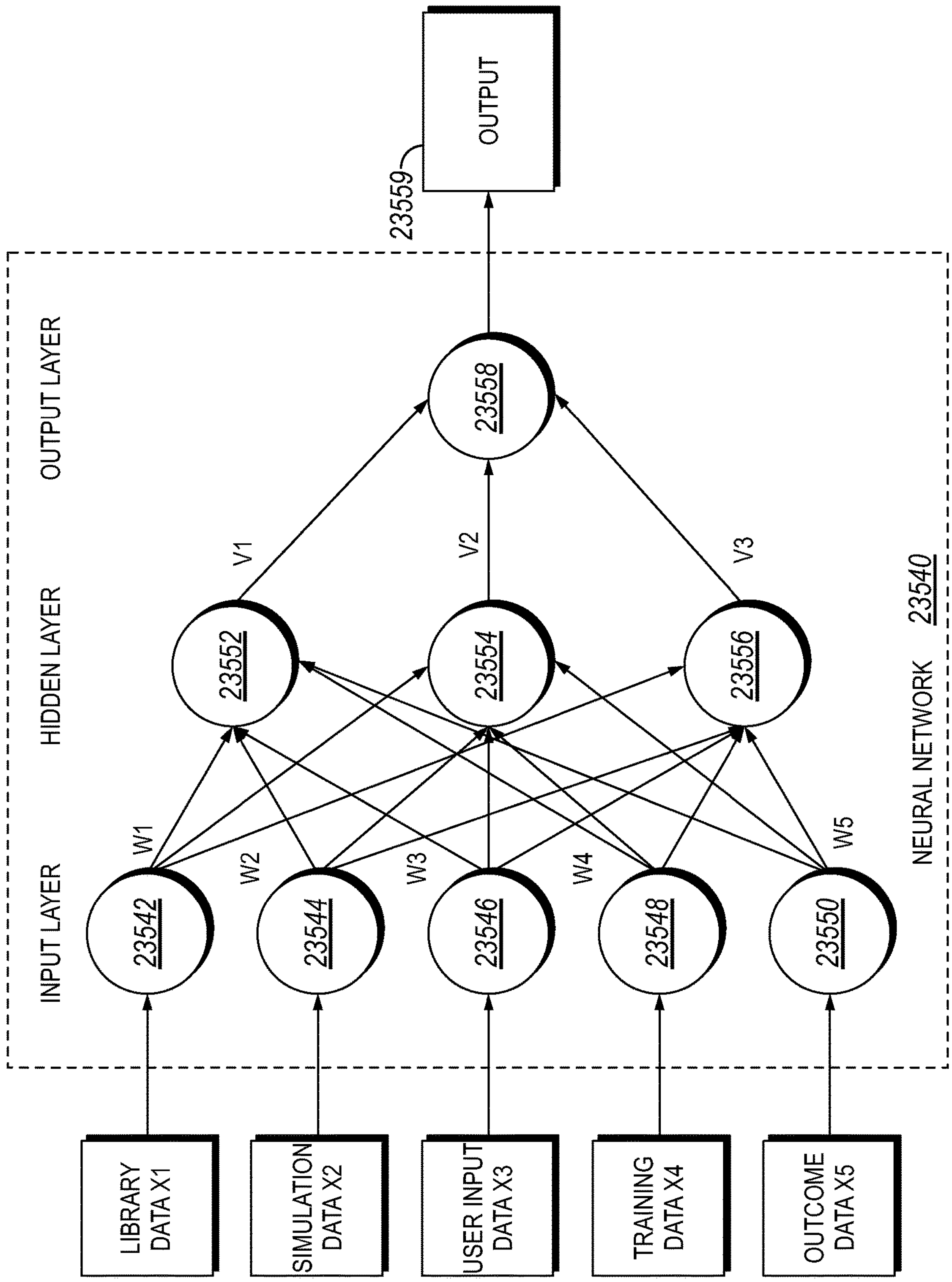

FIG. 236 is a schematic view of an example of a neural network according to some embodiments.

Figure 237:
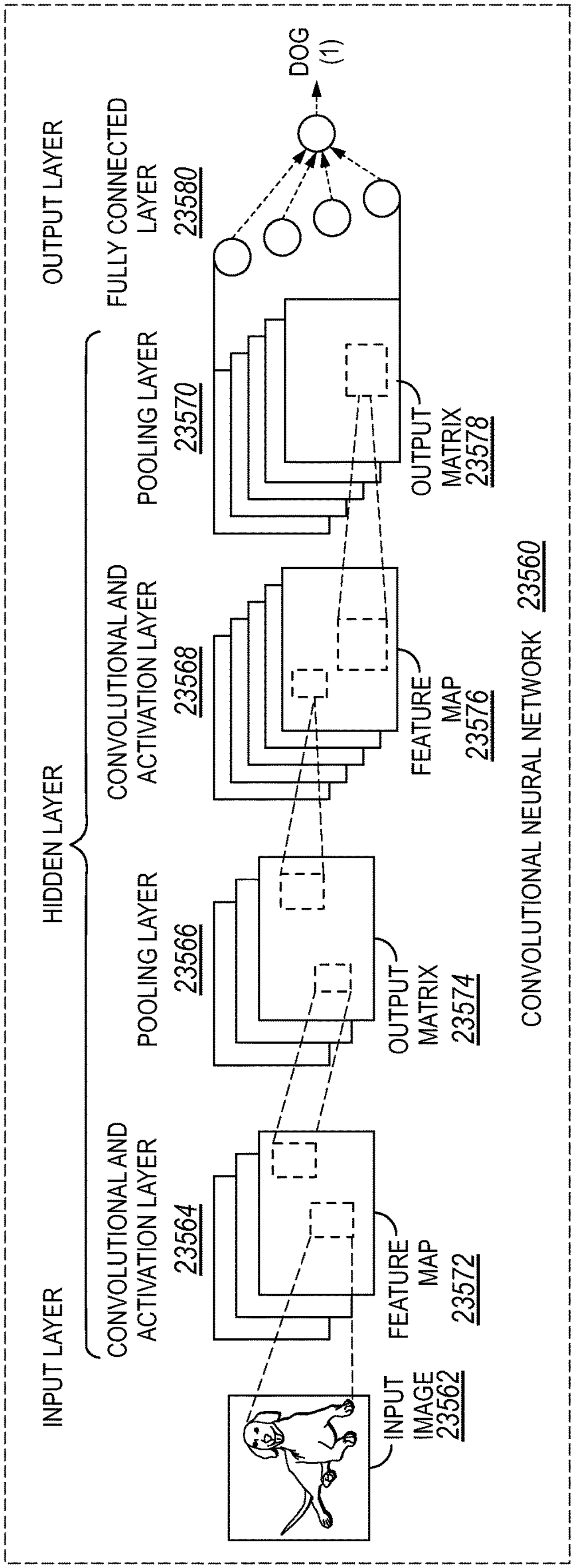

FIG. 237 is a schematic view of an example of a convolutional neural network according to some embodiments.

Figure 238:
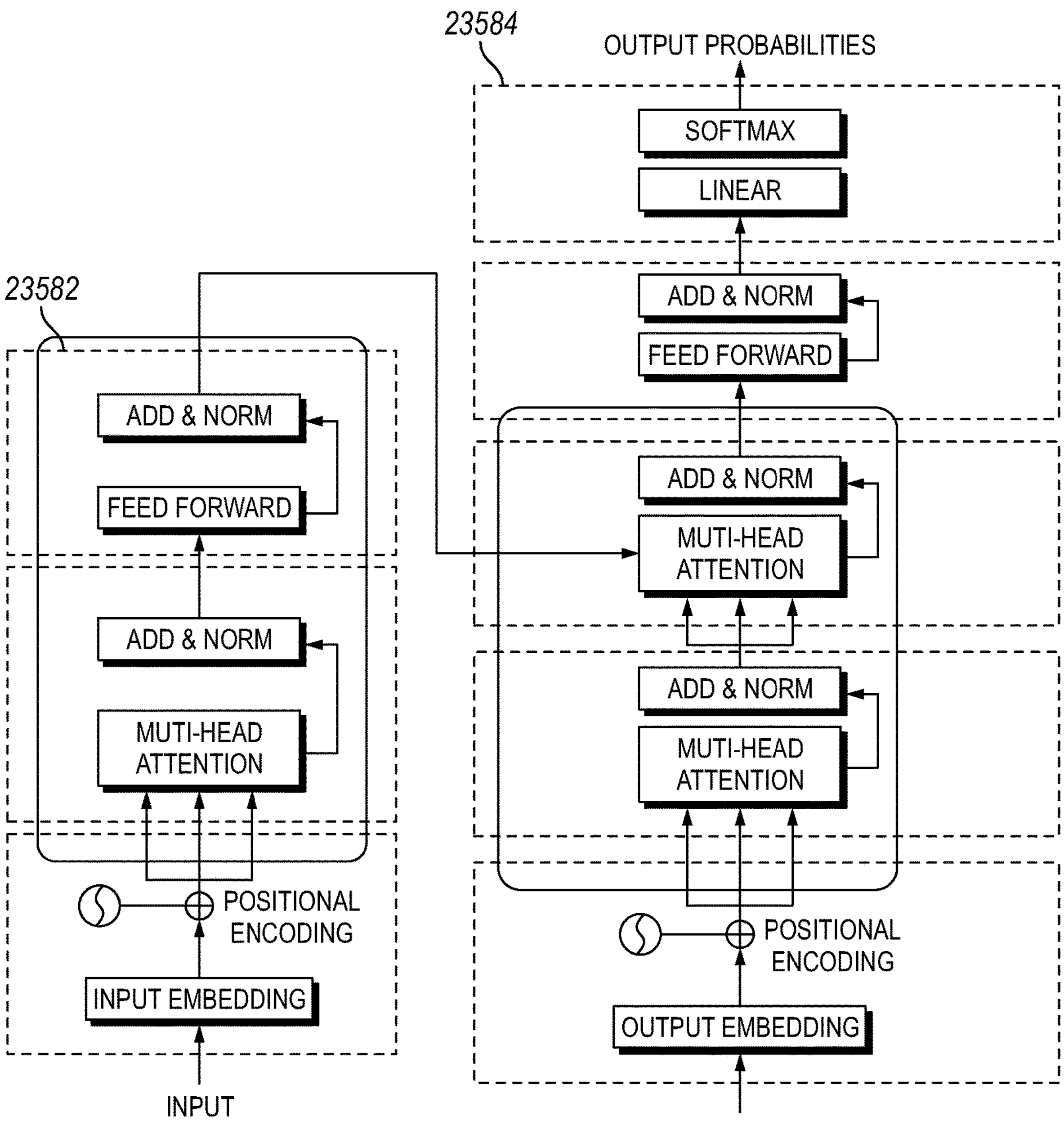

FIG. 238 is a schematic view of an example of a neural network according to some embodiments.

Figure 239:
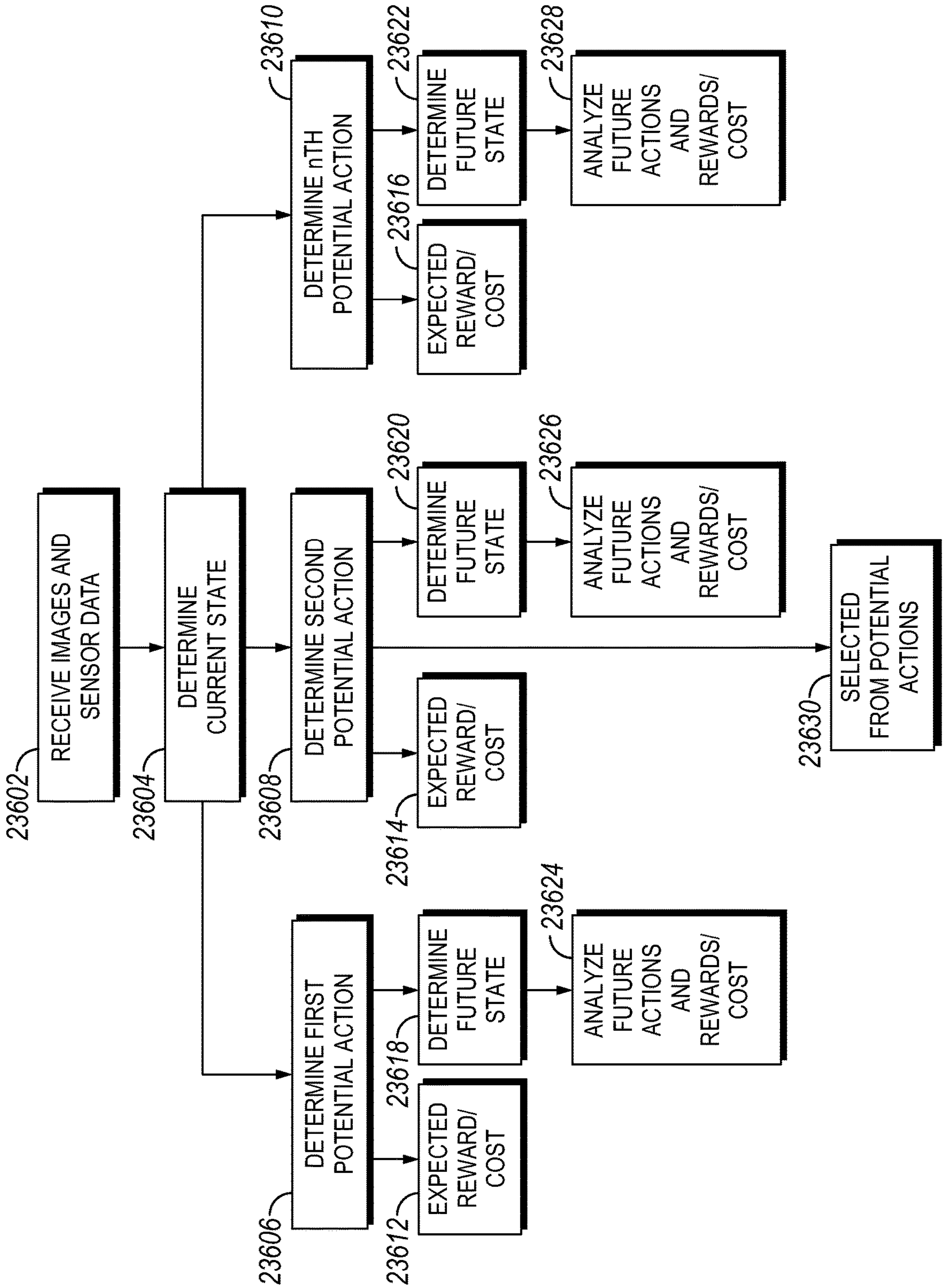

FIG. 239 is a diagram of an approach based on reinforcement learning according to some embodiments.

Market Orchestration Architecture FIGS.

Figure 240:
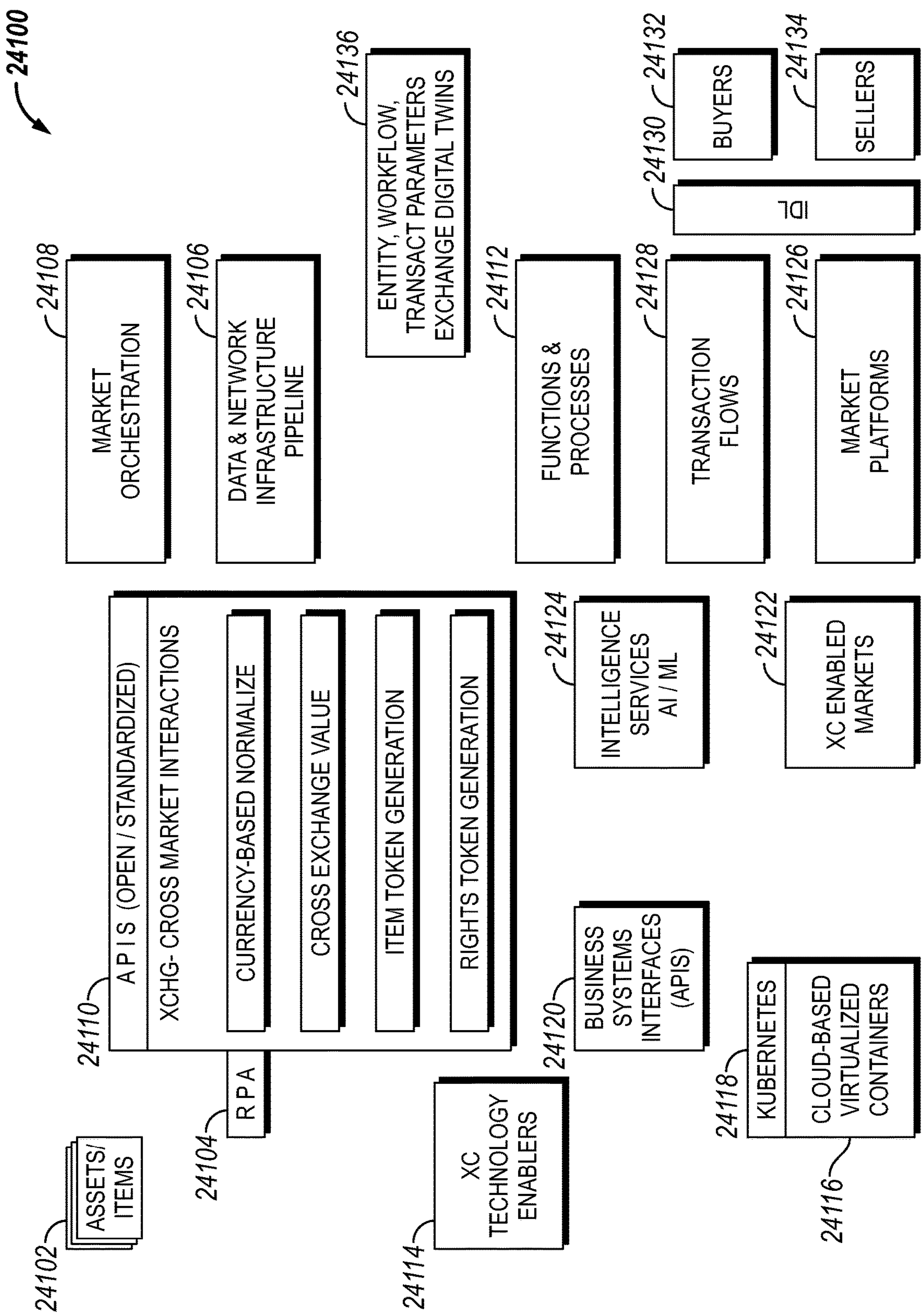

FIG. 240 depicts a block diagram of a market orchestration architecture that integrates cross market exchange methods and systems described herein.

Figure 241:
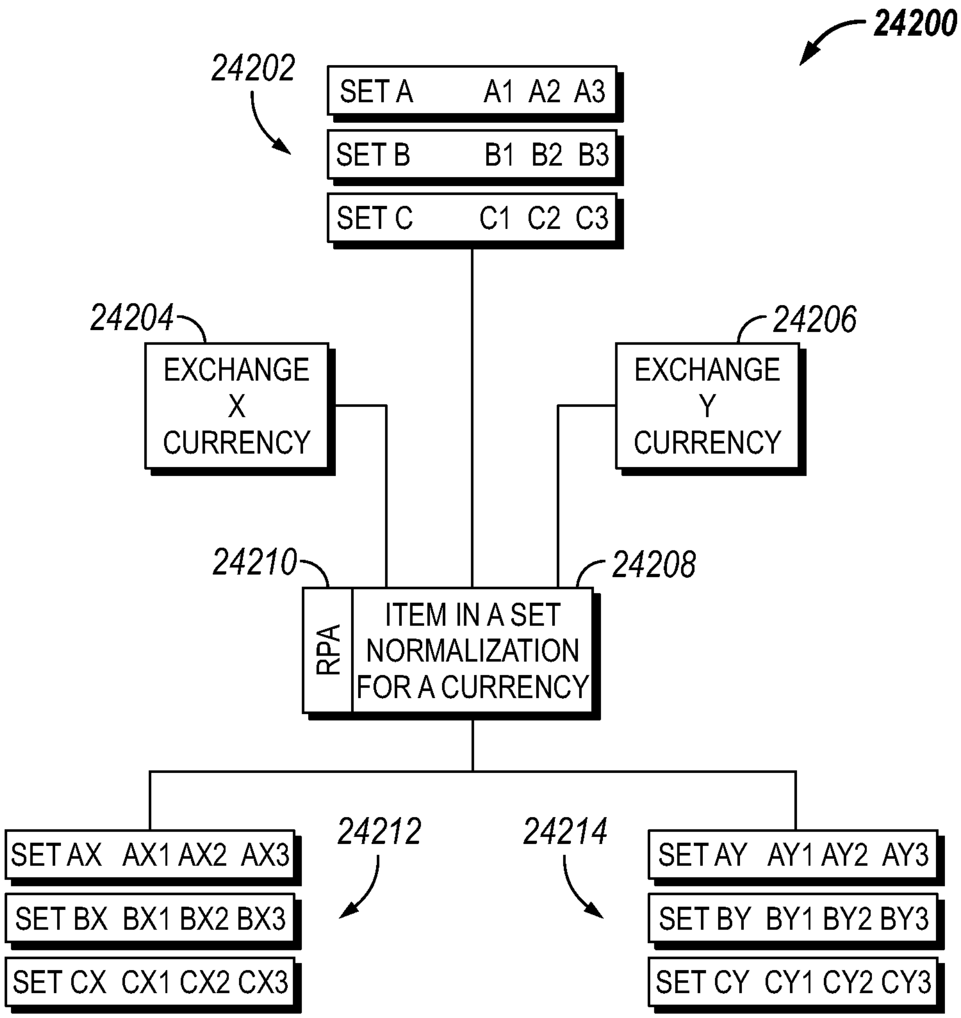

FIG. 241 depicts an example of normalizing item values within a set of items for exchange-specific currencies.

Figure 242:
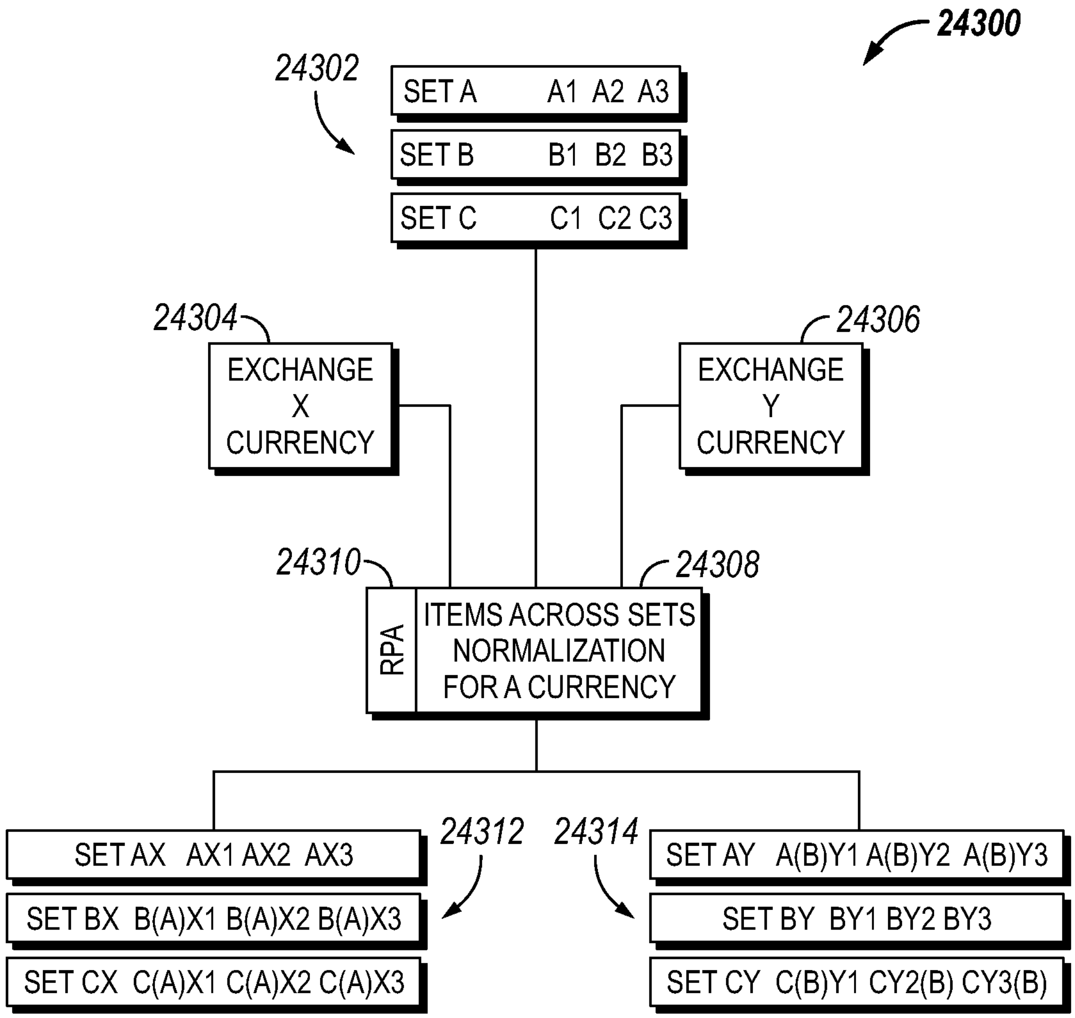

FIG. 242 depicts an example of normalizing item values across sets of items for exchange-specific currencies.

Figure 243:
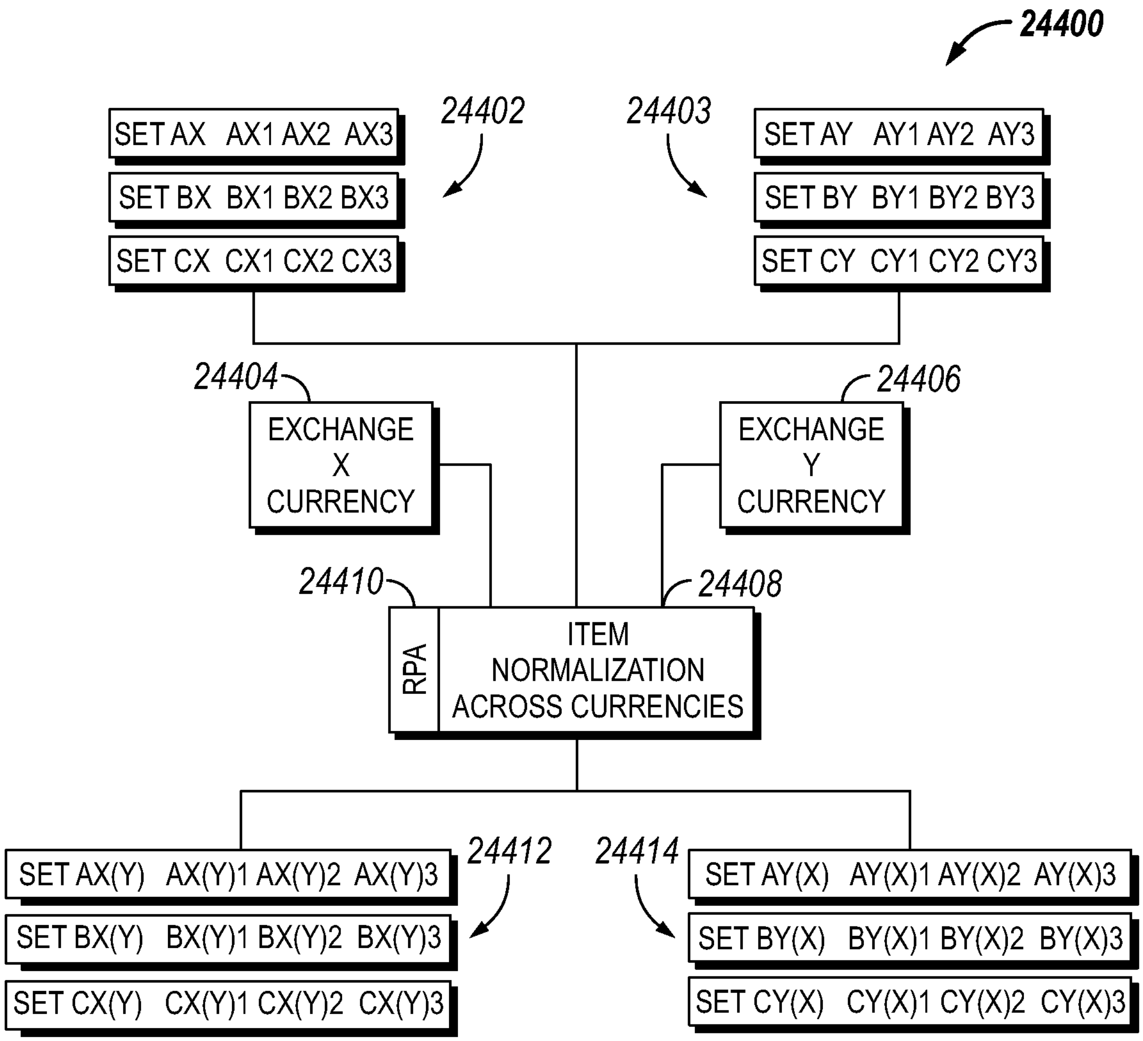

FIG. 243 depicts an example of normalizing a value of an item across a plurality of exchange-specific currencies.

Figure 244:
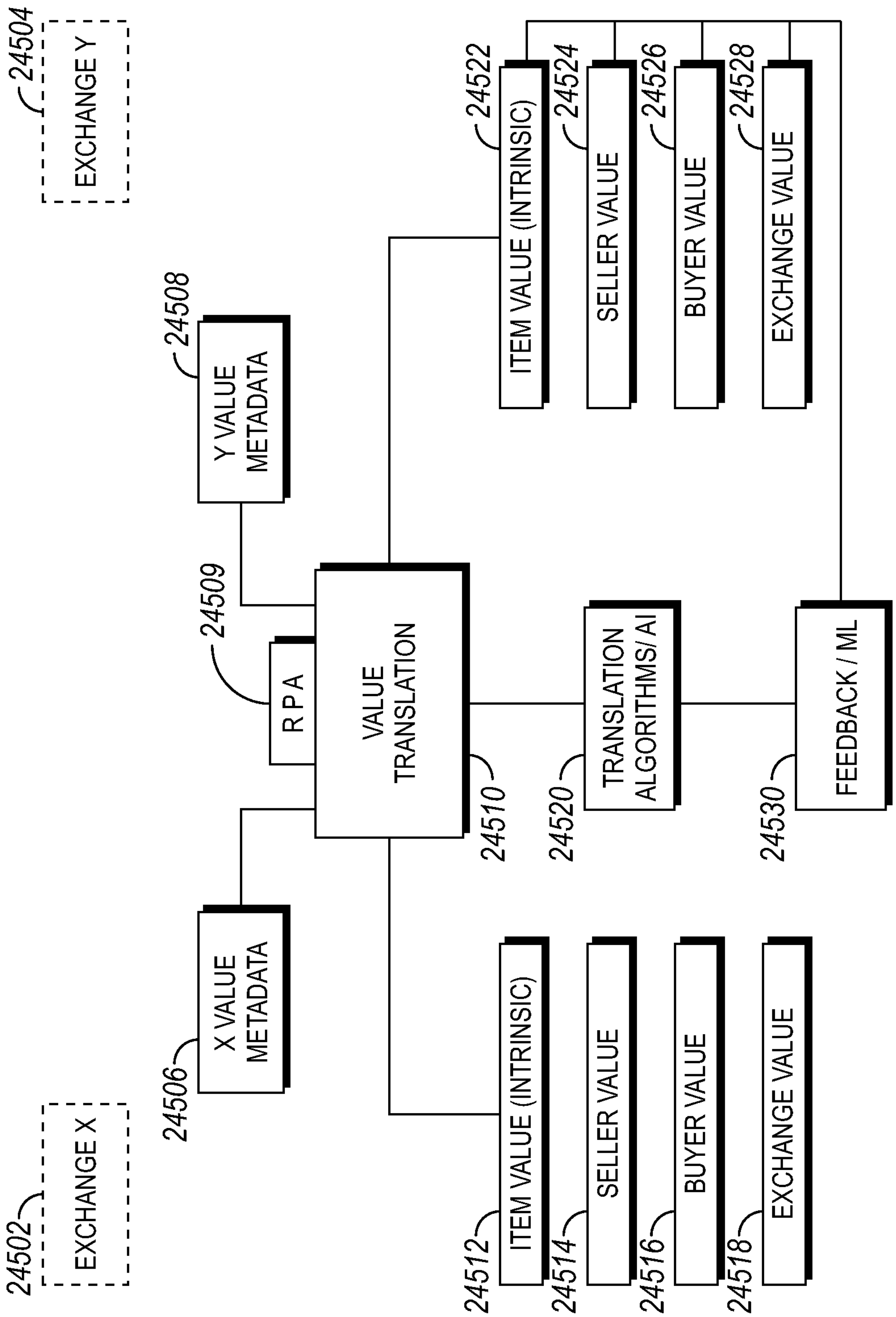

FIG. 244 depicts an example of item value translation among exchanges.

Figure 245:
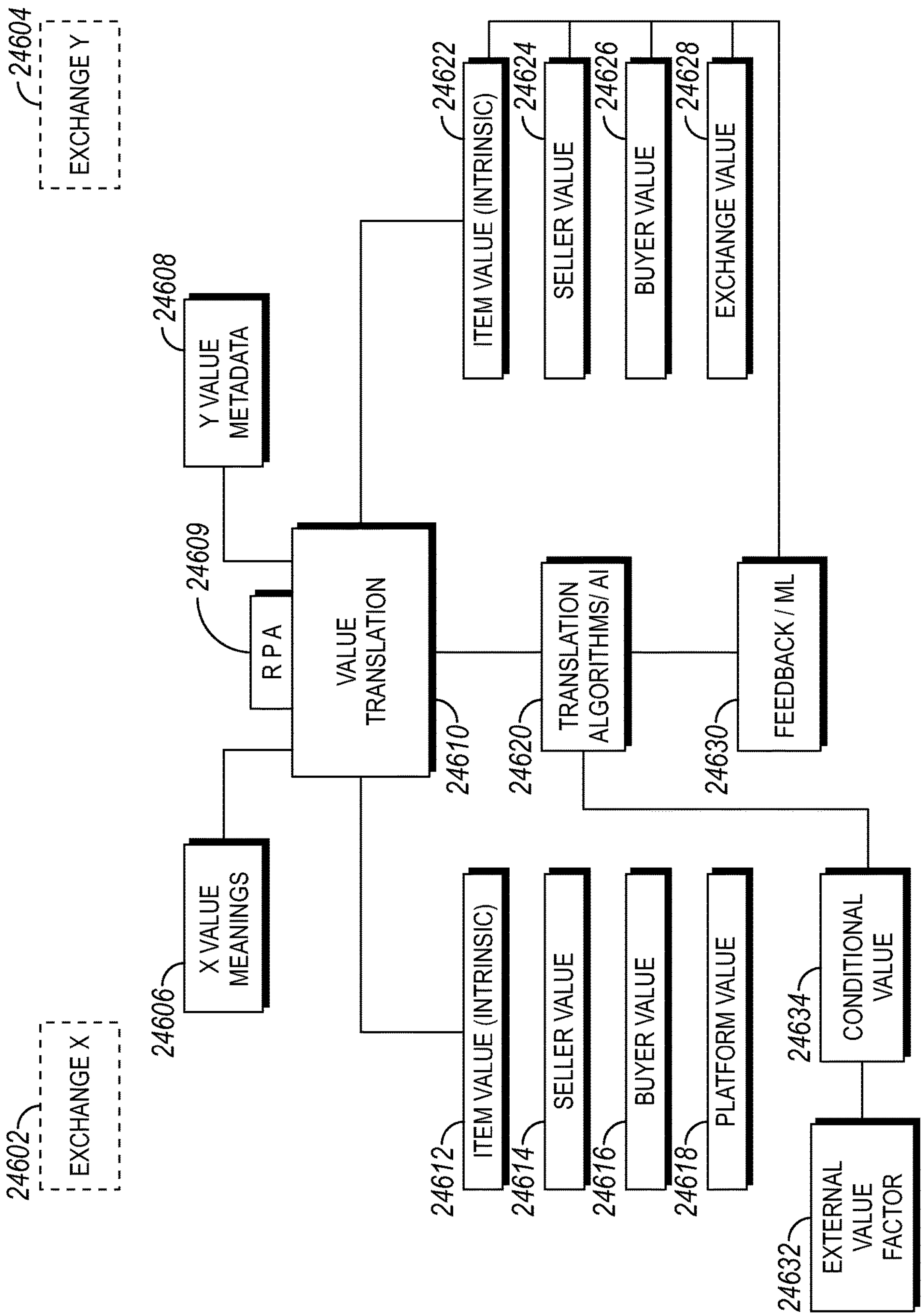

FIG. 245 depicts an example of conditional item value translation among exchanges.

Figure 246:
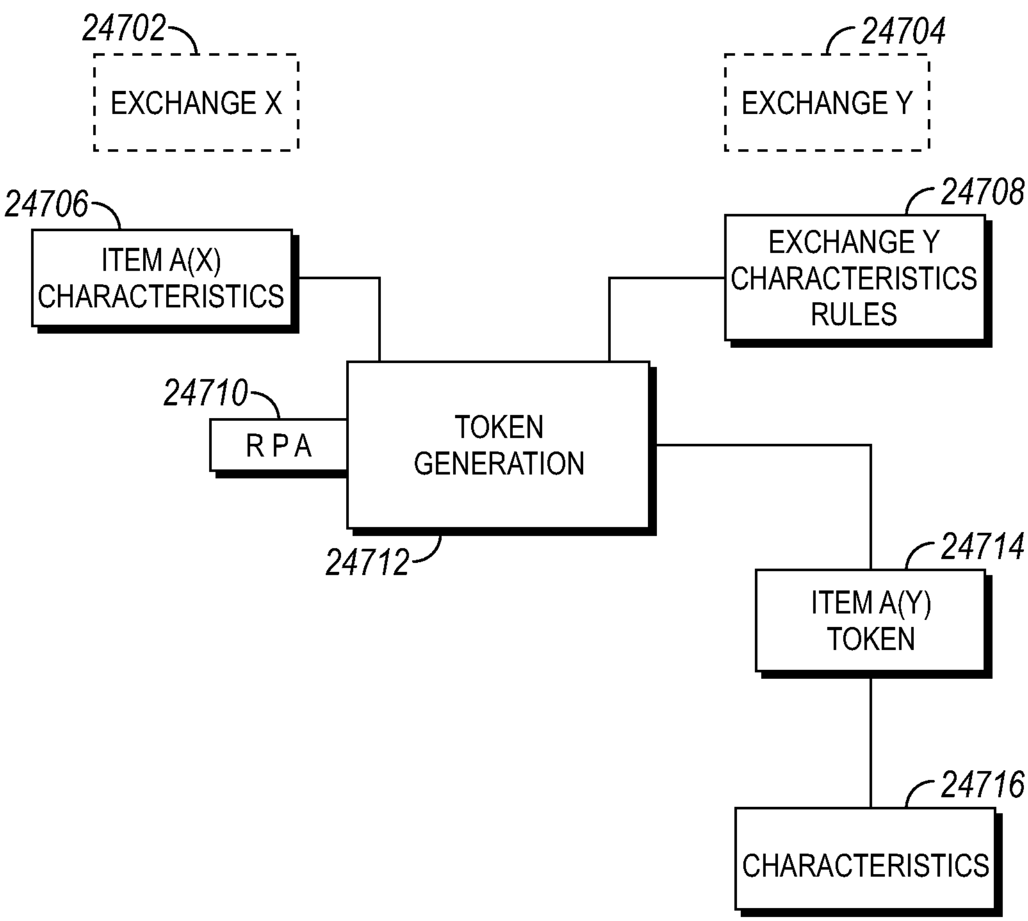

FIG. 246 depicts an example of item-representative token generation for use in a target exchange based on characteristics of the item from a source exchange.

Figure 247:
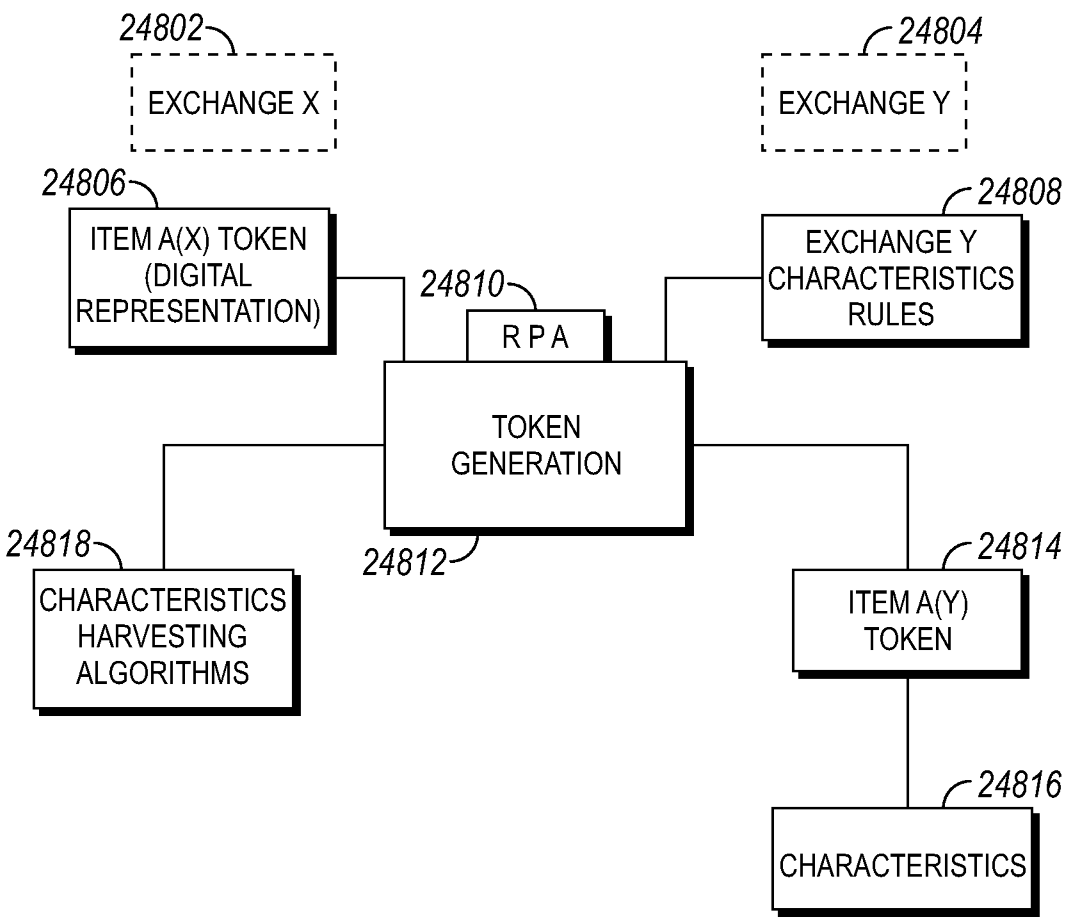

FIG. 247 depicts an example of the item-representative token generation of FIG. 246 through application of item characteristics harvesting algorithms.

Figure 248:
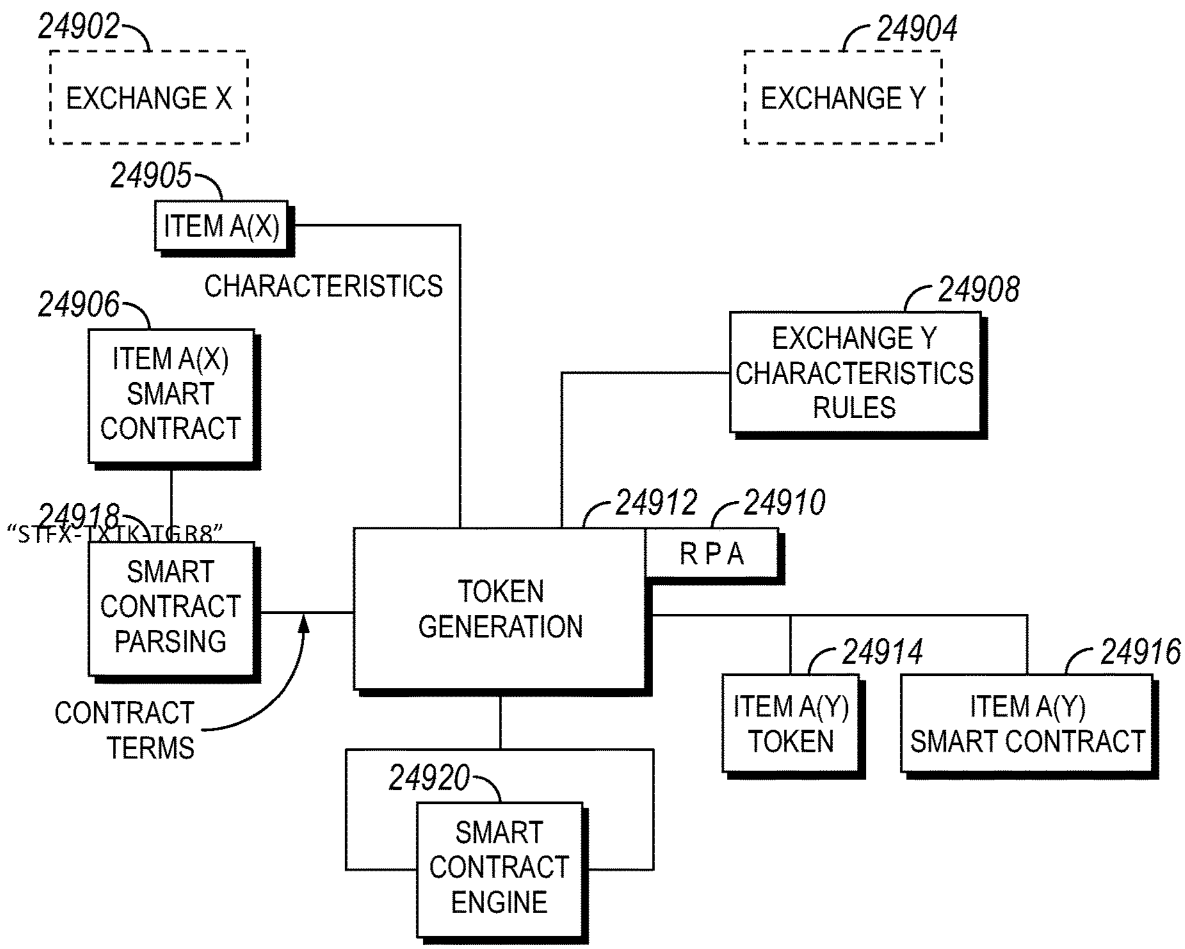

FIG. 248 depicts an example of the item-representative token generation of FIG. 246 through processing of smart contracts associated with the item in a source exchange.

Figure 249:
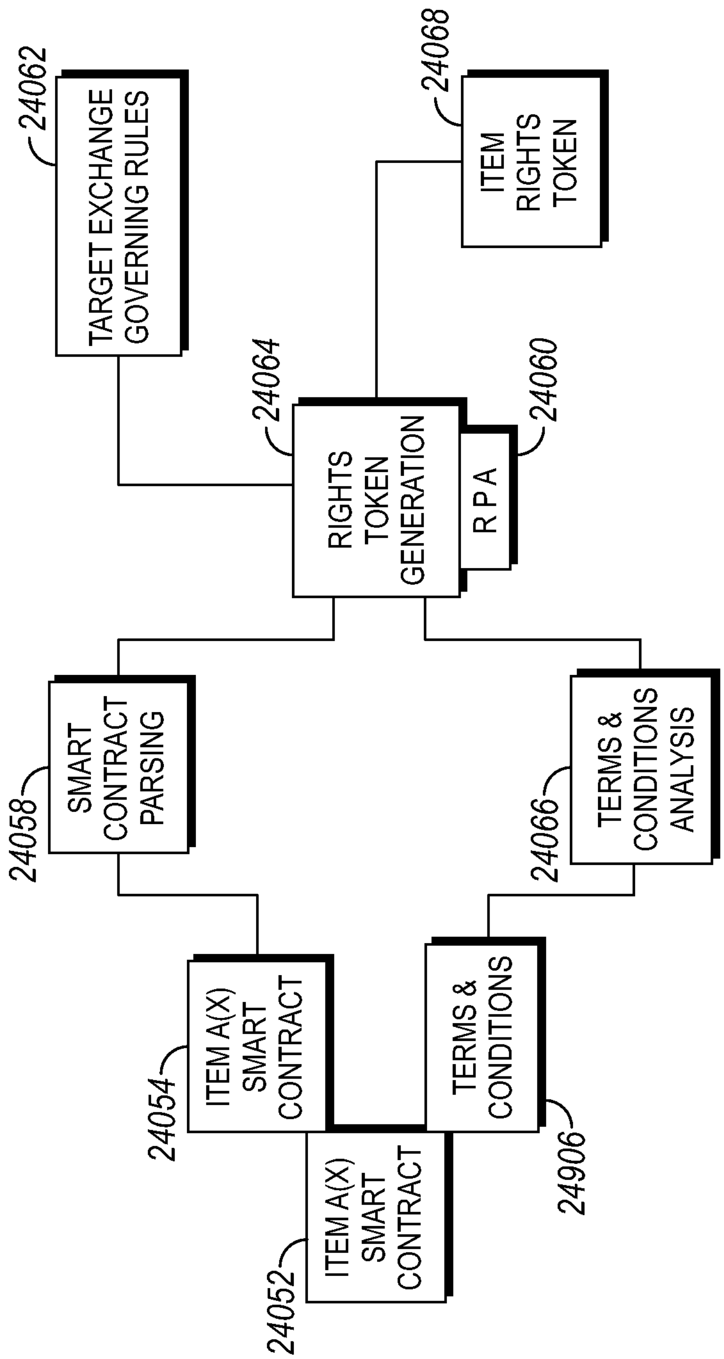

FIG. 249 depicts an example of generating a rights token for an item based on at least one of a smart contract and terms and conditions for the item.

Figure 250:
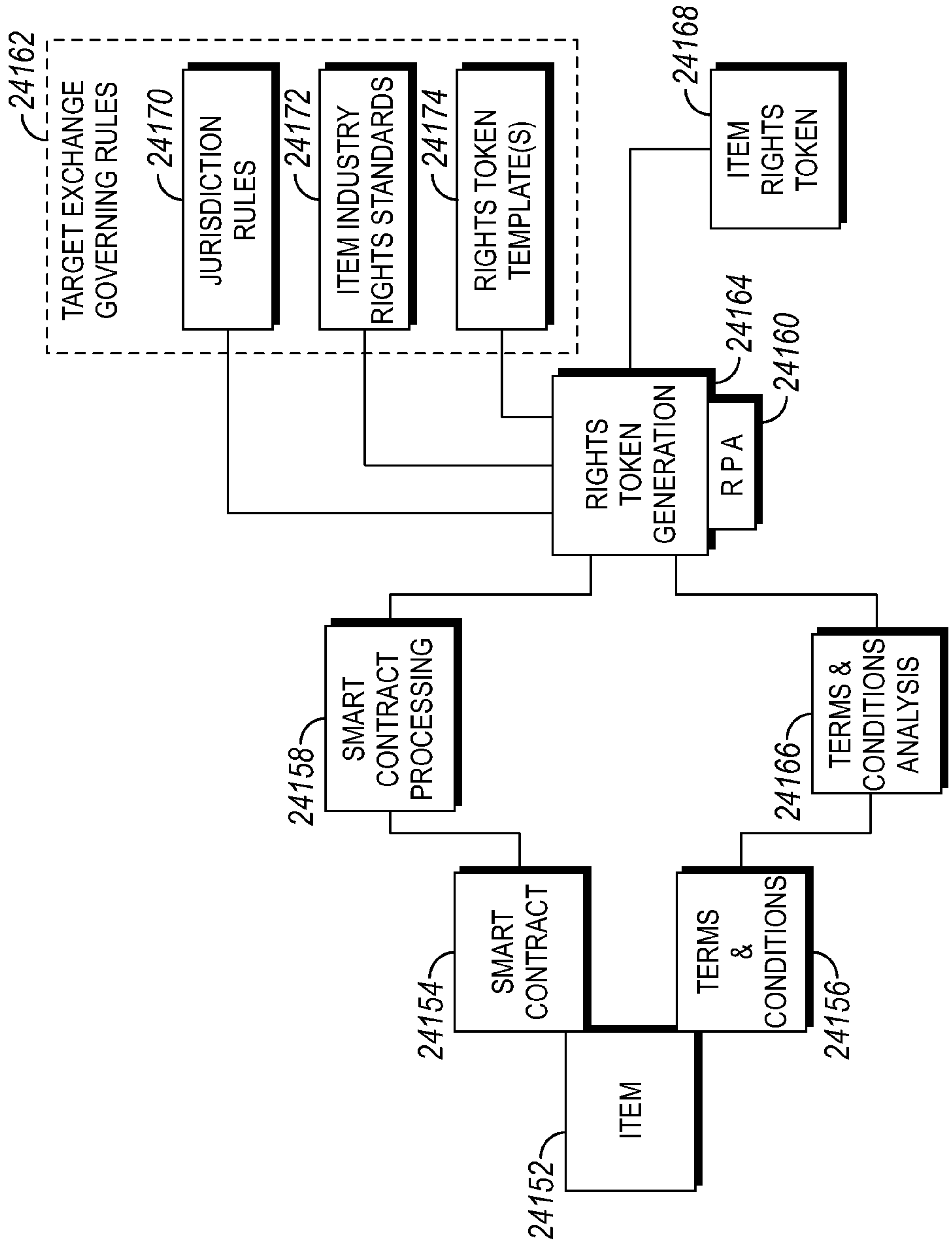

FIG. 250 depicts an example of generating a rights token for an item based on at least one of a smart contract and terms and conditions for the item for a range of exchange governing rules.

Figure 251:
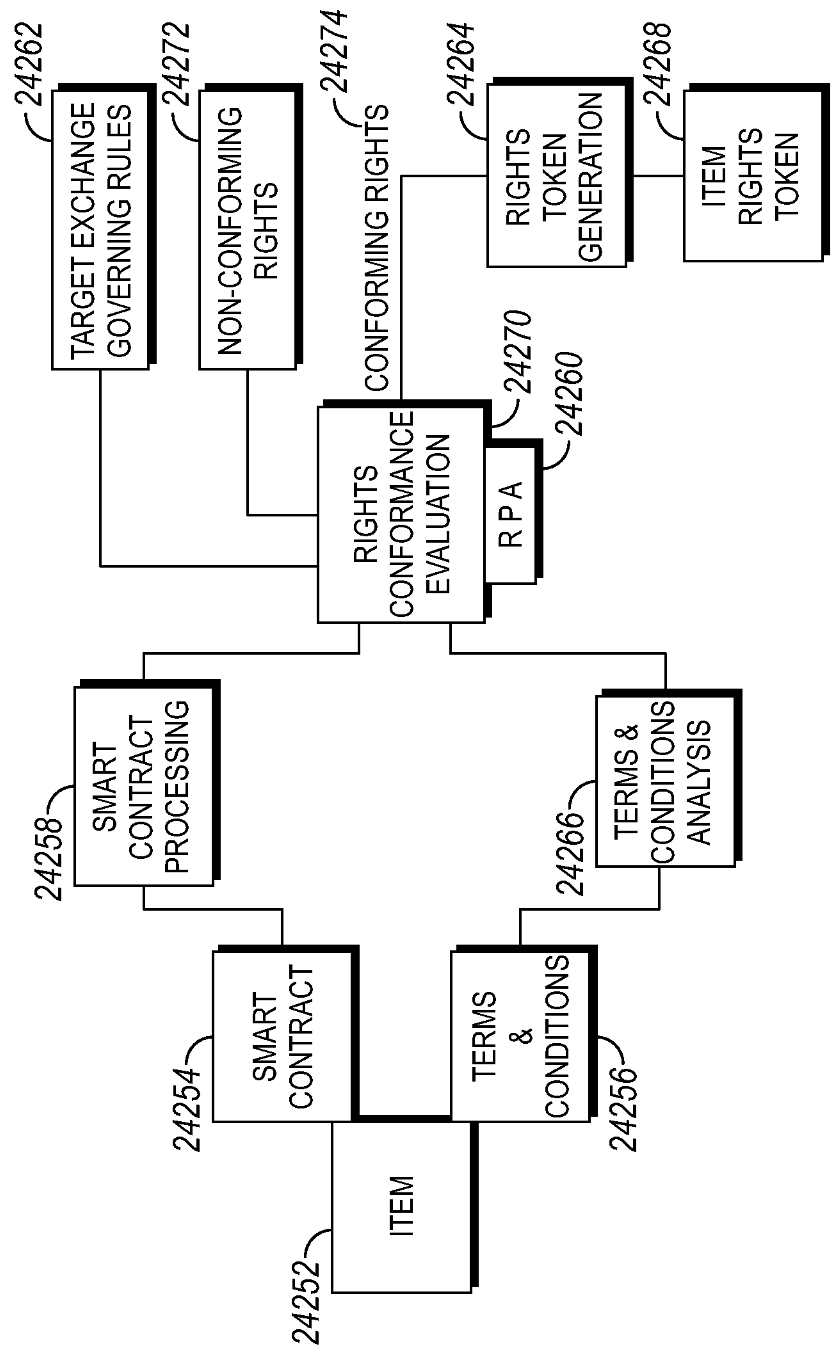

FIG. 251 depicts an example of generating a rights token for an item based on at least one of a smart contract and terms and conditions for the item and further based on conformance of detected rights with exchange governing rules.

Figure 252:
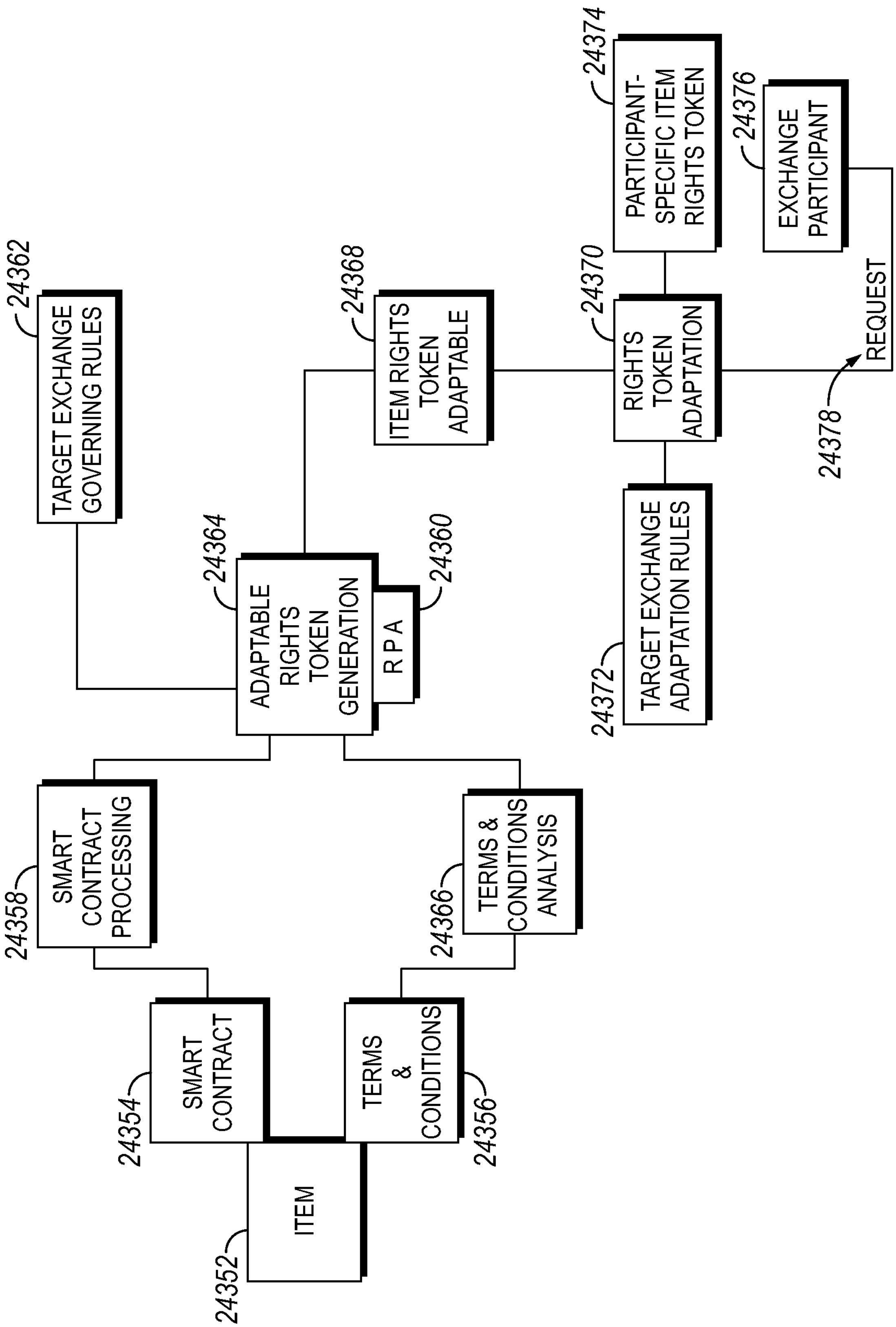

FIG. 252 depicts an example of generating an adaptable rights token for an item based on at least one of a smart contract and terms and conditions for the item and target exchange adaptation rules.

Figure 253:
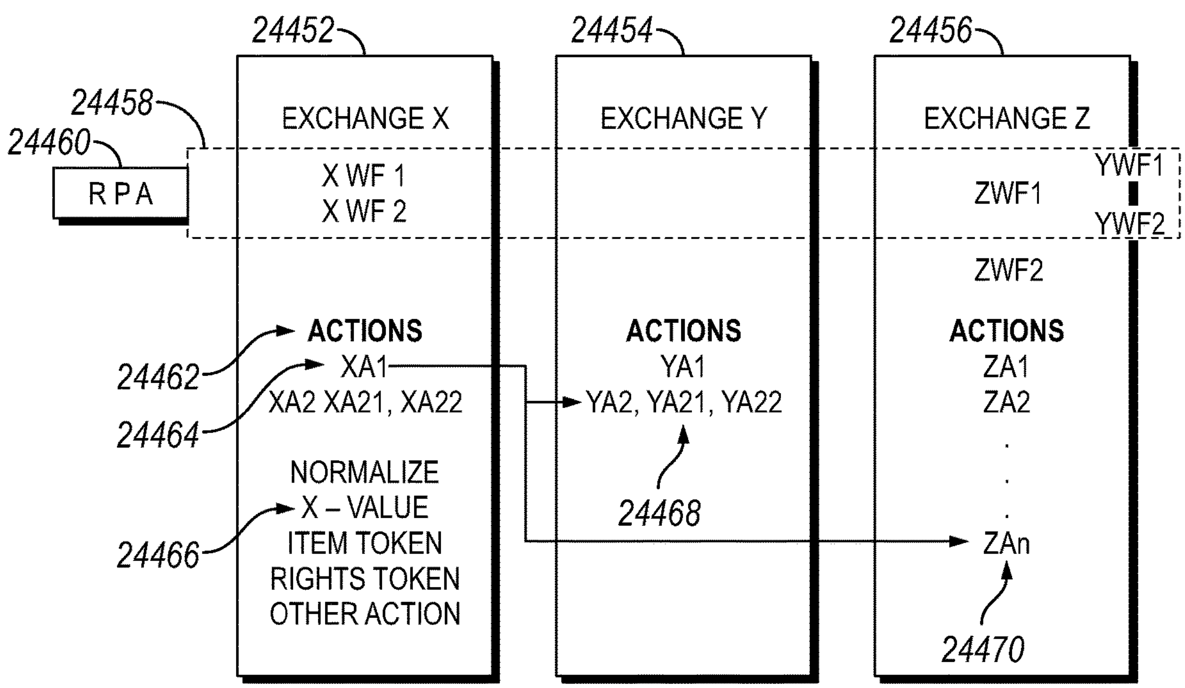

FIG. 253 depicts an example of automatically cascading actions across exchanges in which workflows are automated through robotic process automation.

Figure 254:
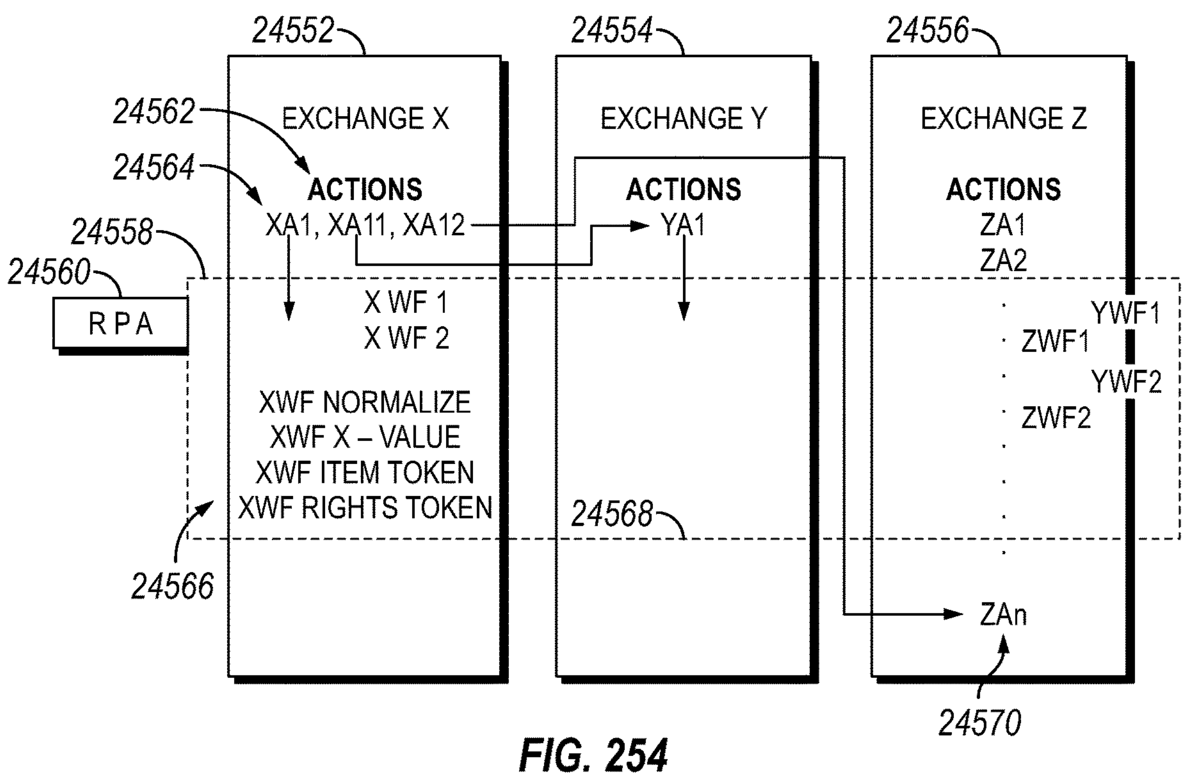

FIG. 254 depicts an example of automatically cascading workflow initiation actions across exchanges in which the workflows are automated through robotic process automation.

Figure 255:
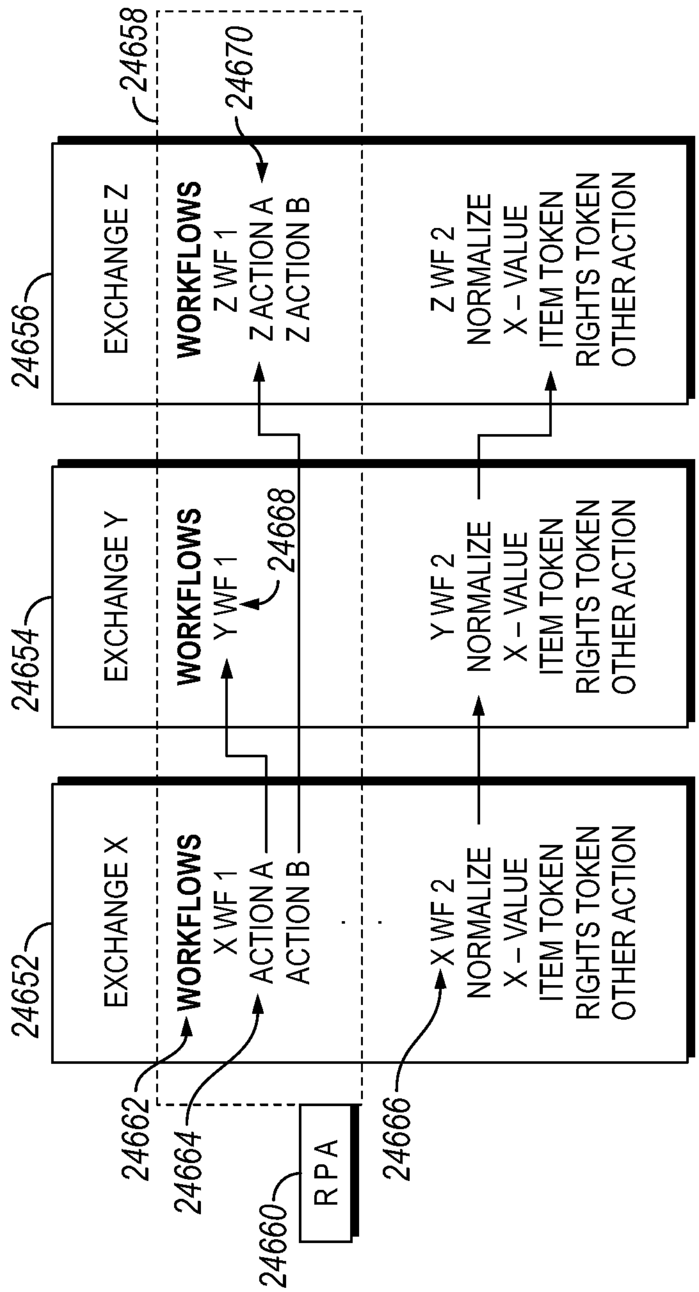

FIG. 255 depicts an example of automatically cascading actions of workflows across exchanges in which the workflows are automated through robotic process automation.

Figure 256:
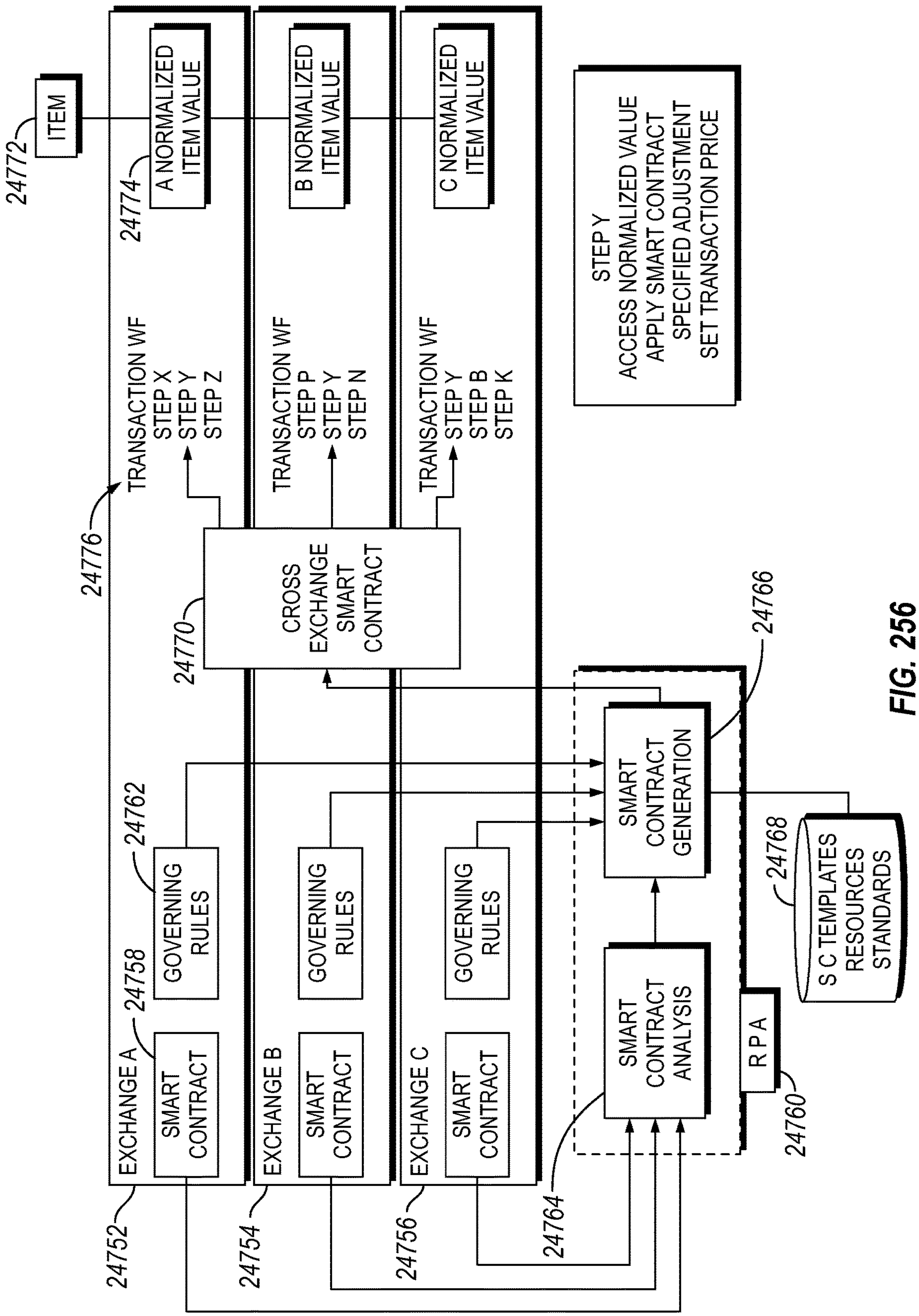

FIG. 256 depicts an example of applying robotic process automation to generate a cross-exchange smart contract from discrete exchange-specific smart contracts.

Figure 257:
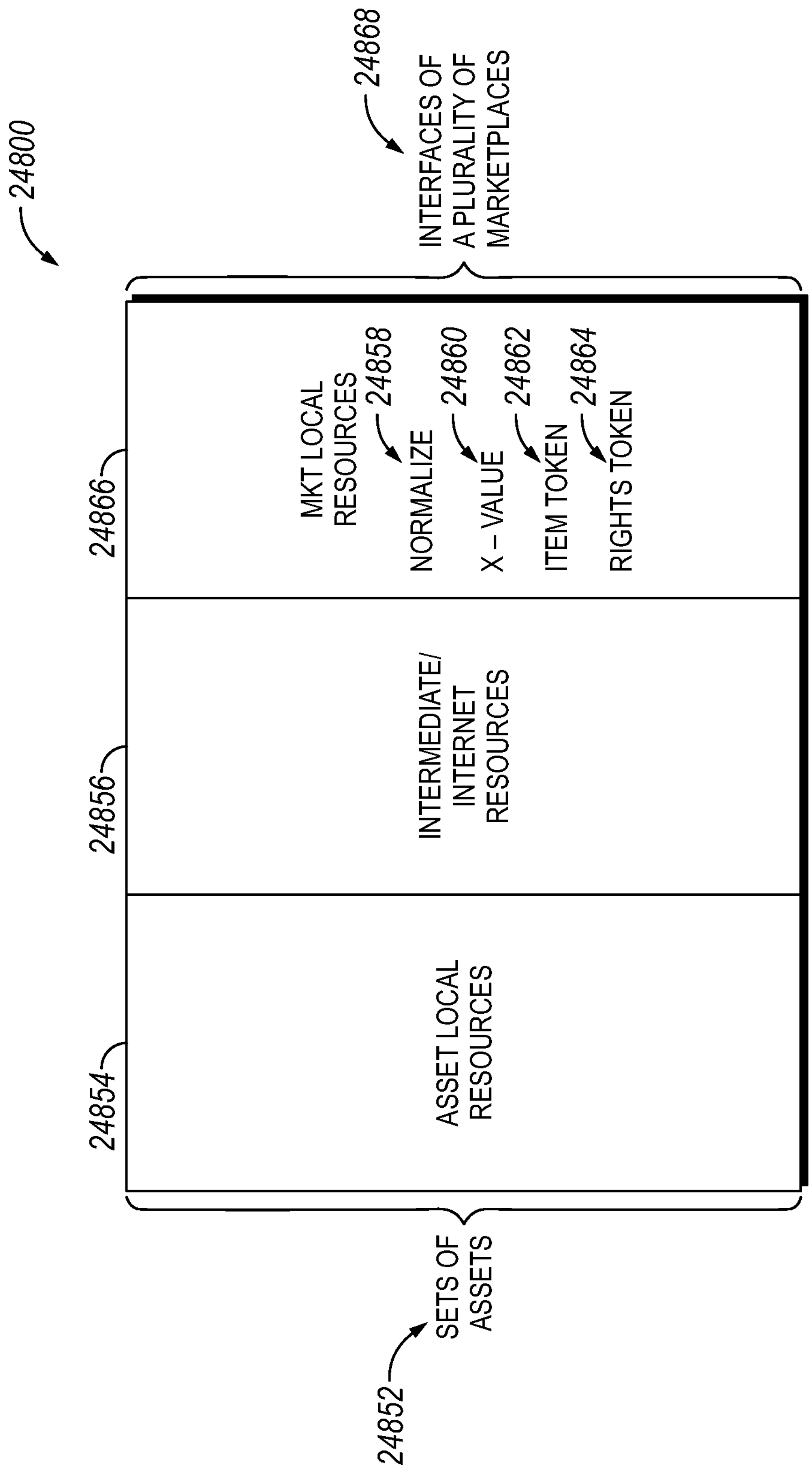

FIG. 257 depicts an example of a self-adapting asset data delivery network infrastructure pipeline that includes one or more of the normalization, value translation, item tokenization, or rights tokenization methods or systems described herein.

Intelligent Data Layer FIGS.

Figure 258:
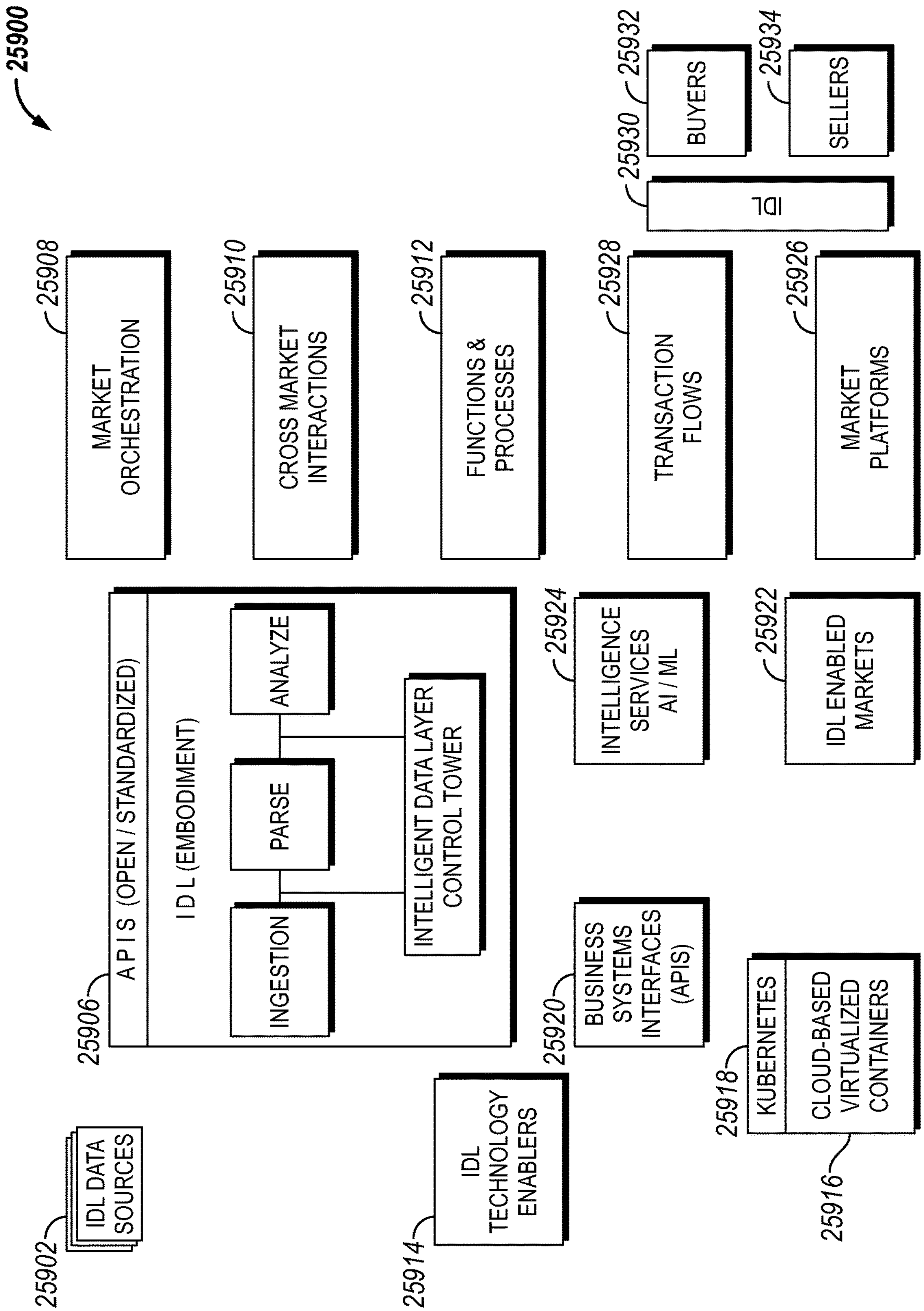

FIG. 258 depicts a block diagram of exemplary features, capabilities, and interfaces of an intelligent data layer platform.

Figure 259:
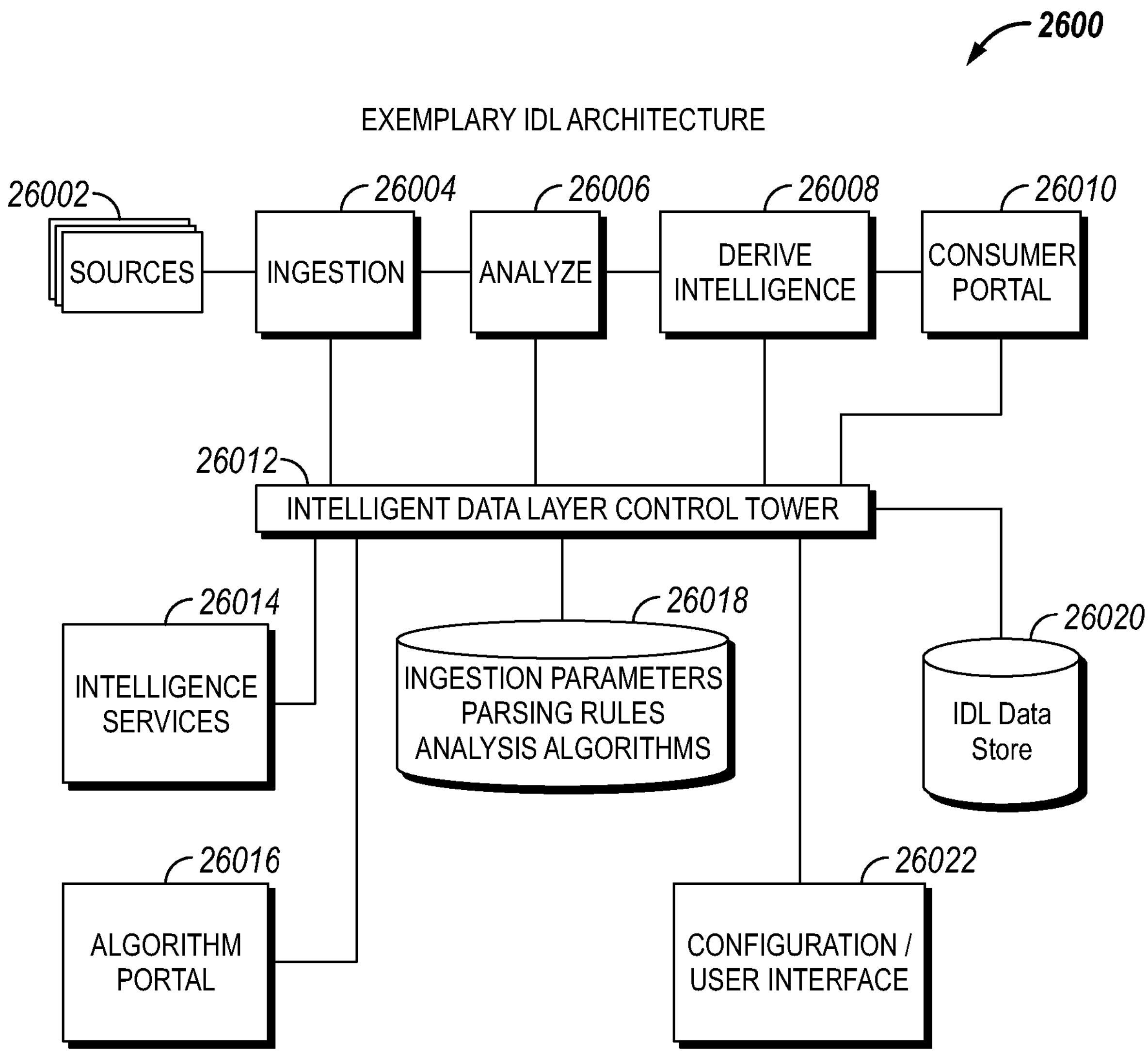

FIG. 259 depicts a block diagram of an exemplary intelligent data layer architecture.

Figure 260:
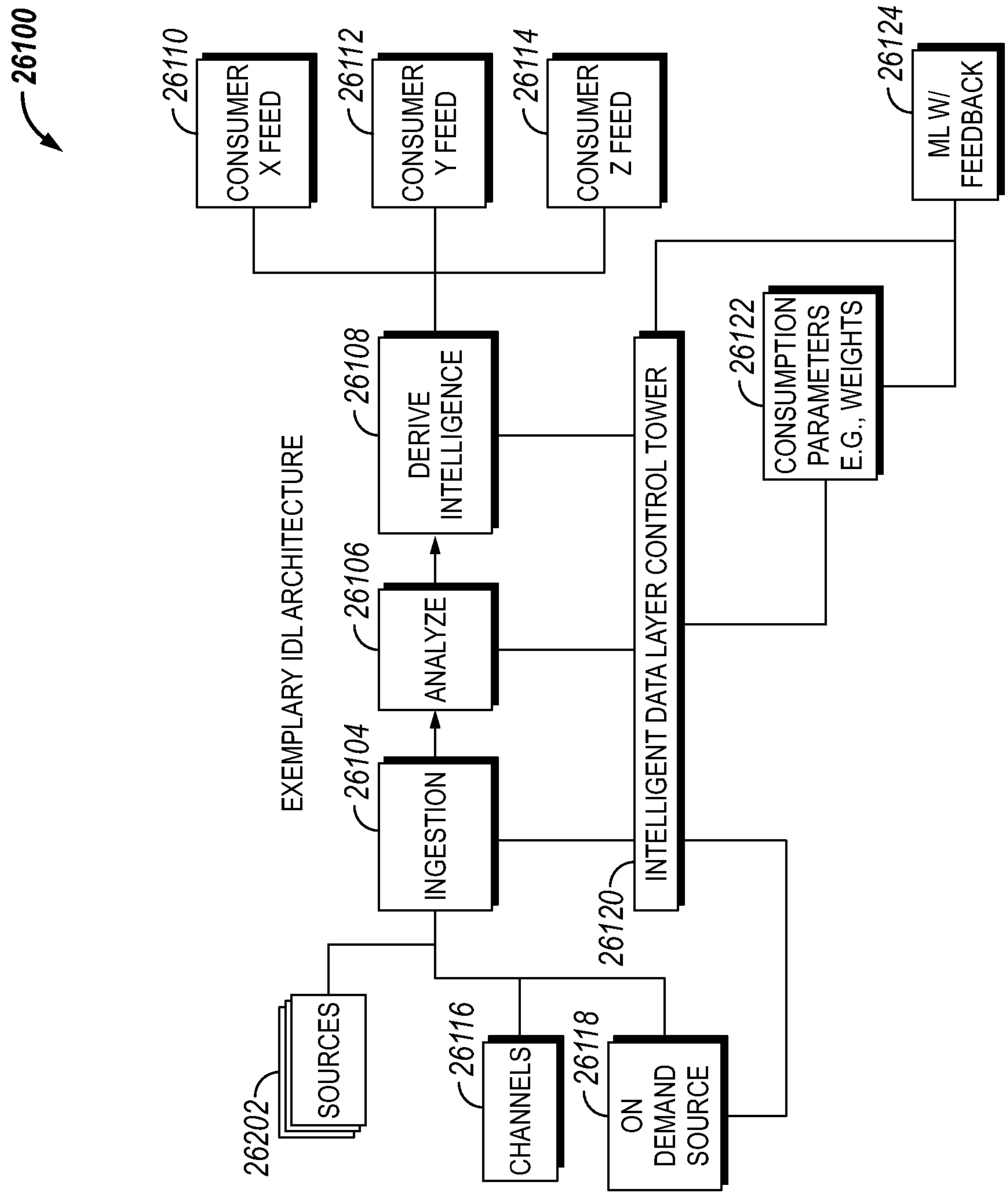

FIG. 260 depicts a block diagram of an independently operated intelligent data layer for producing data for a plurality of data consumers.

Figure 261:
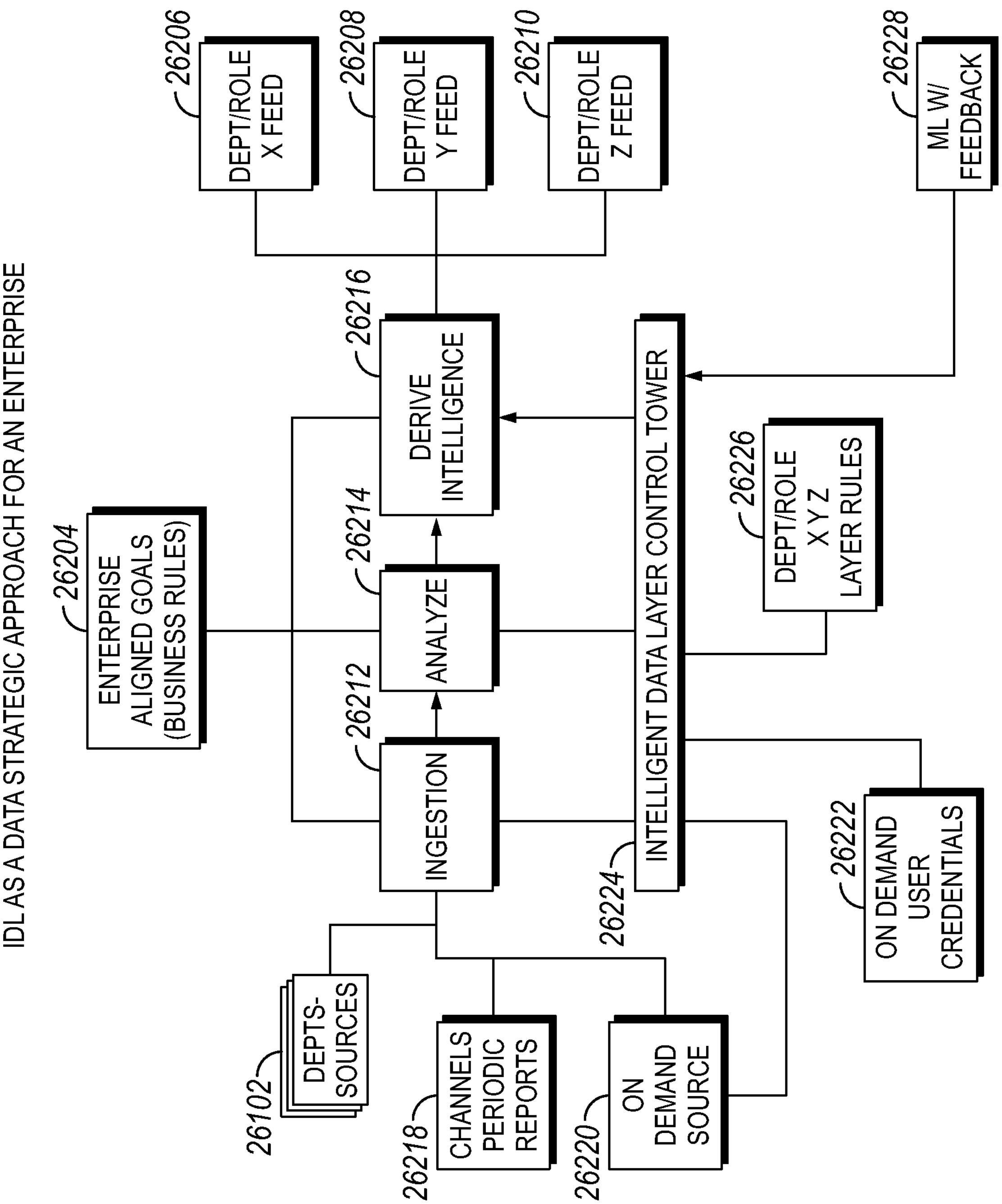

FIG. 261 depicts a block diagram of an intelligent data layer platform deployment for data-strategic approach of an enterprise.

Figure 262:
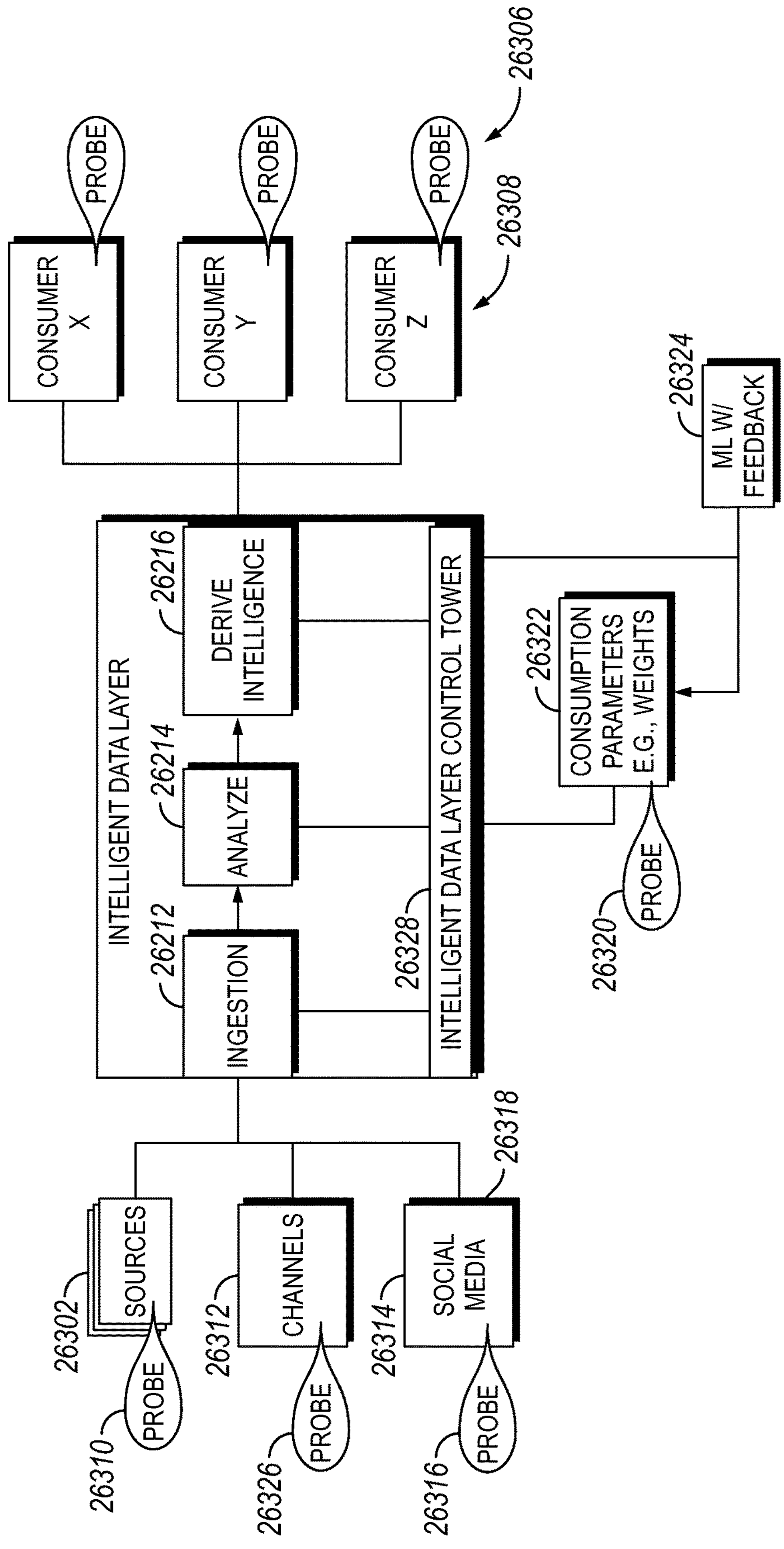

FIG. 262 depicts a block diagram of a remote intelligent data layer with actively deployed elements for dynamic on-demand IDL operation.

FIG. 263 depicts a diagram of mapping parameters of a data producer (e.g., source) with a data consumer.

Figure 264:
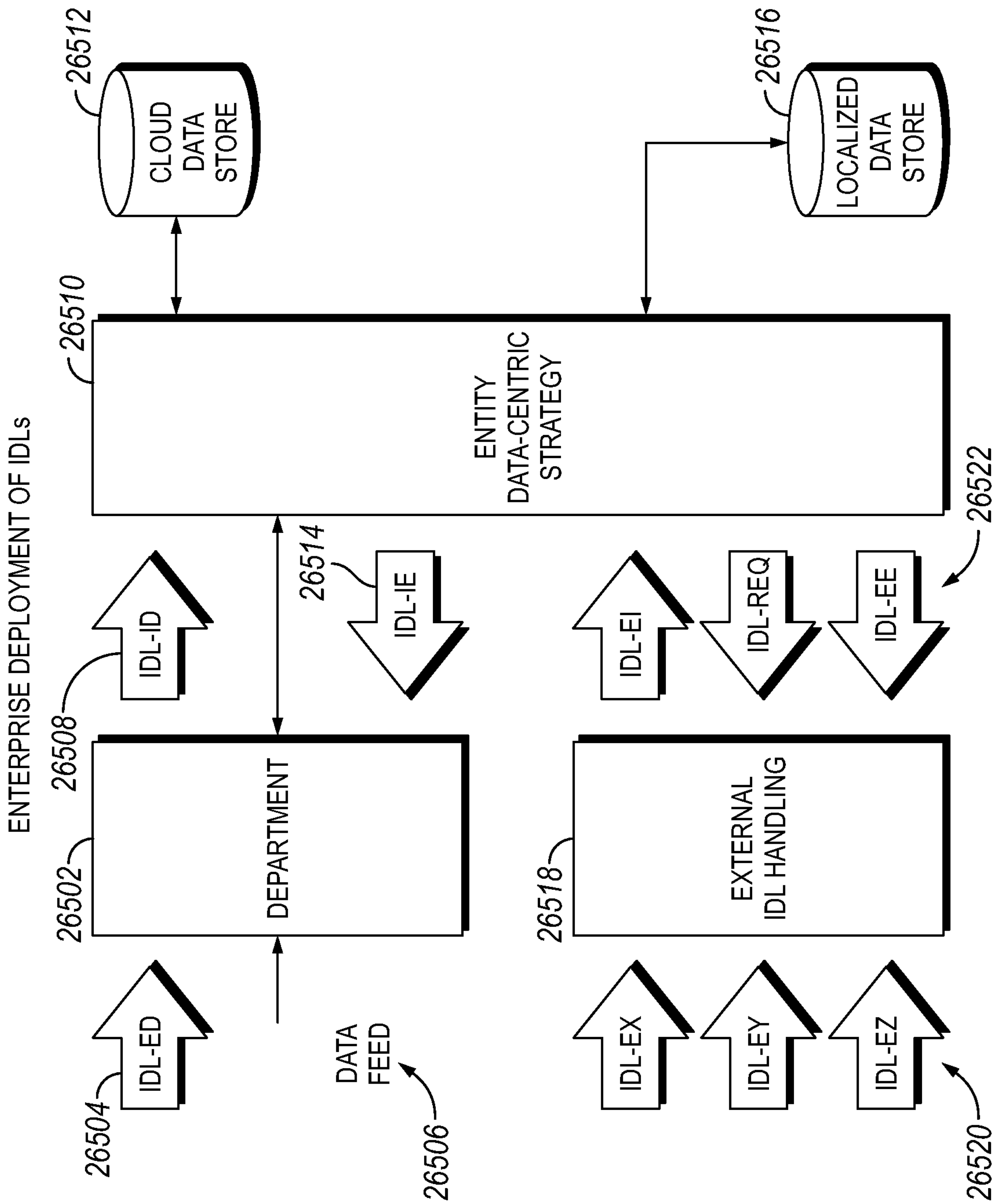

FIG. 264 depicts a block diagram of an enterprise deployment of intelligent data layers.

Figure 265:
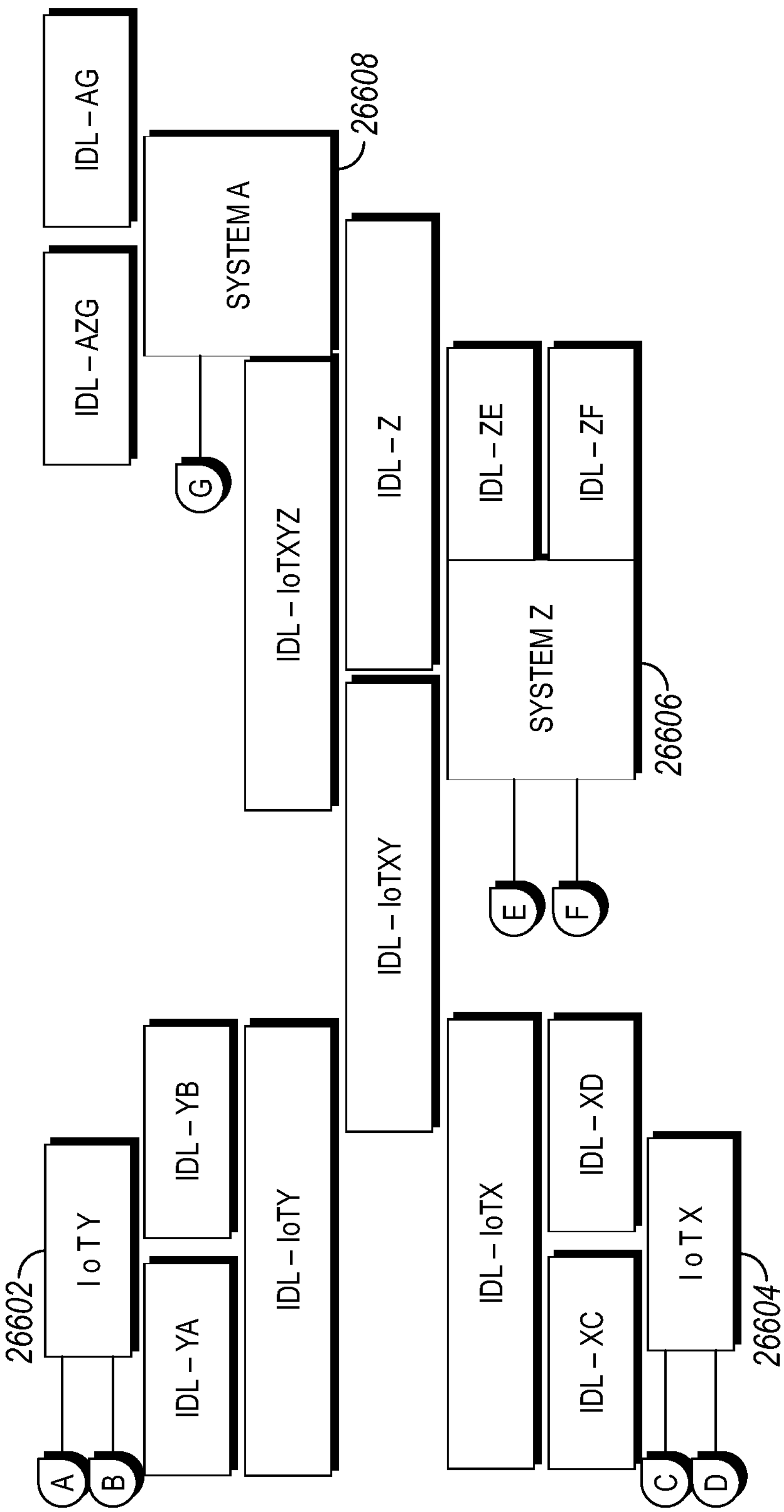

FIG. 265 depicts a block diagram of a network constructed of intelligent data layers.

Figure 266:
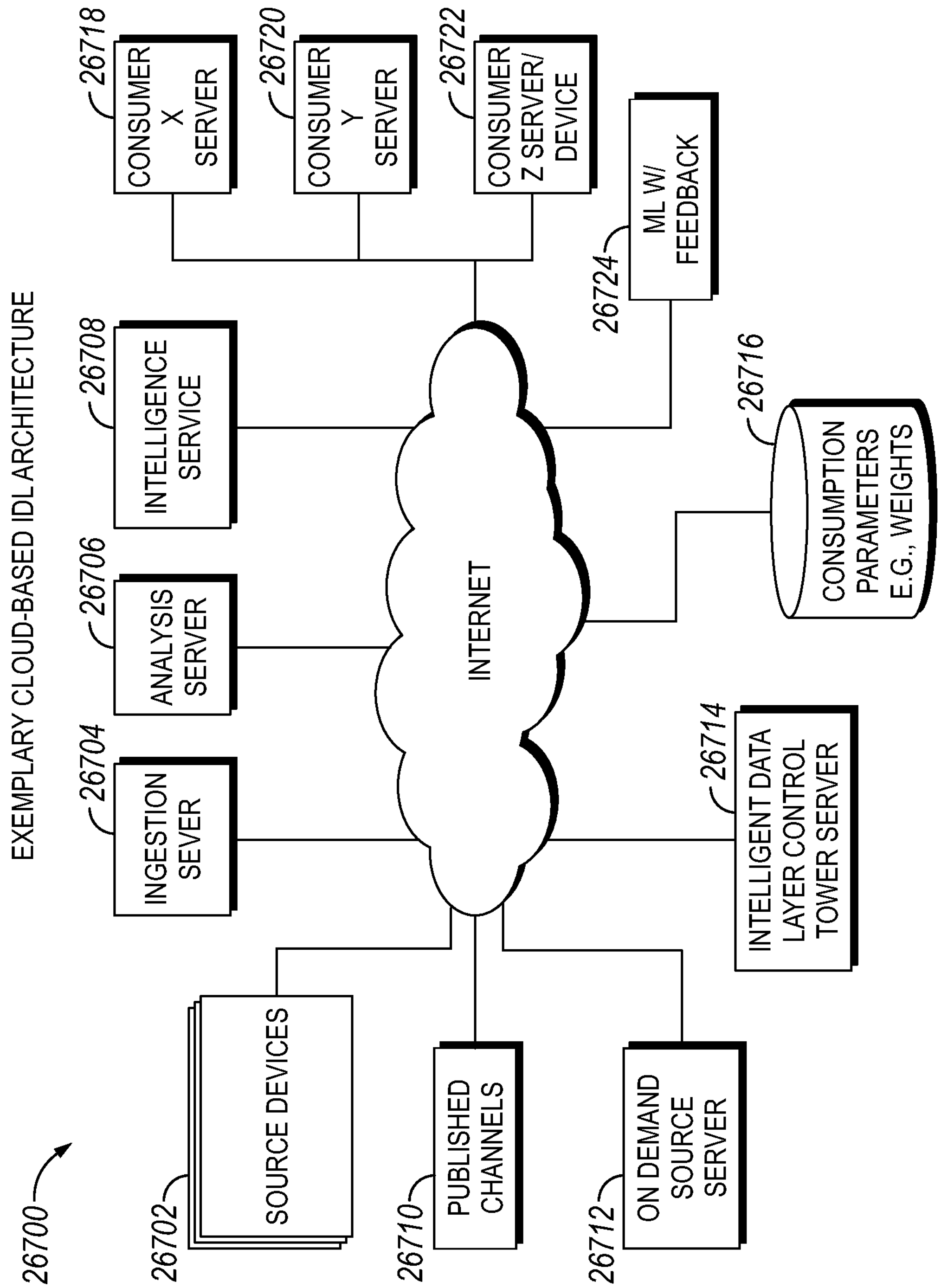

FIG. 266 depicts a block diagram of an exemplary cloud-based deployment for an intelligent data layer architecture.

Figure 267:
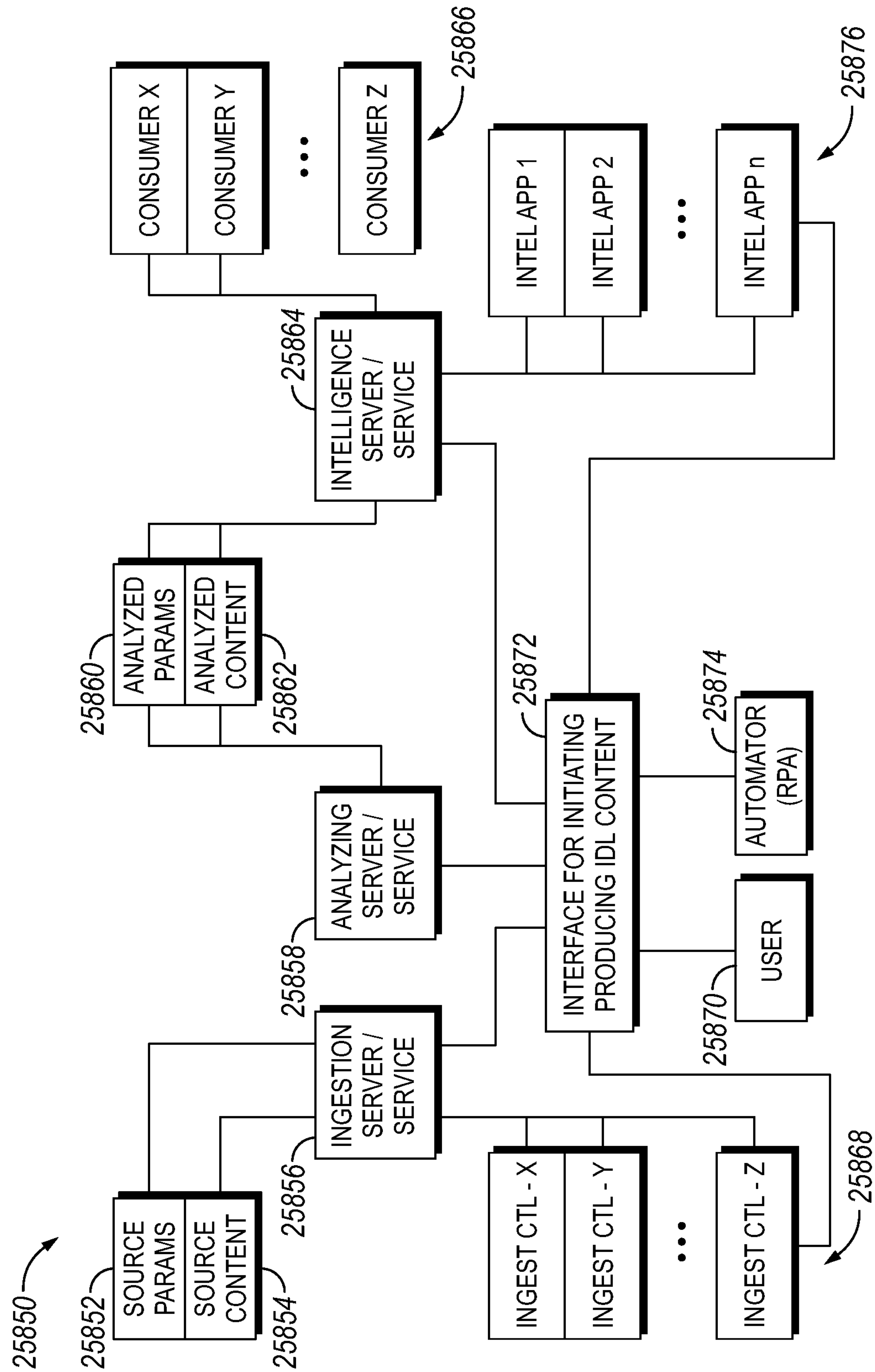

FIG. 267 depicts a block diagram of a multi-use (configurable) intelligent data layer architecture to produce different layer content and intelligence for different purposes/uses/consumers.

Figure 268:
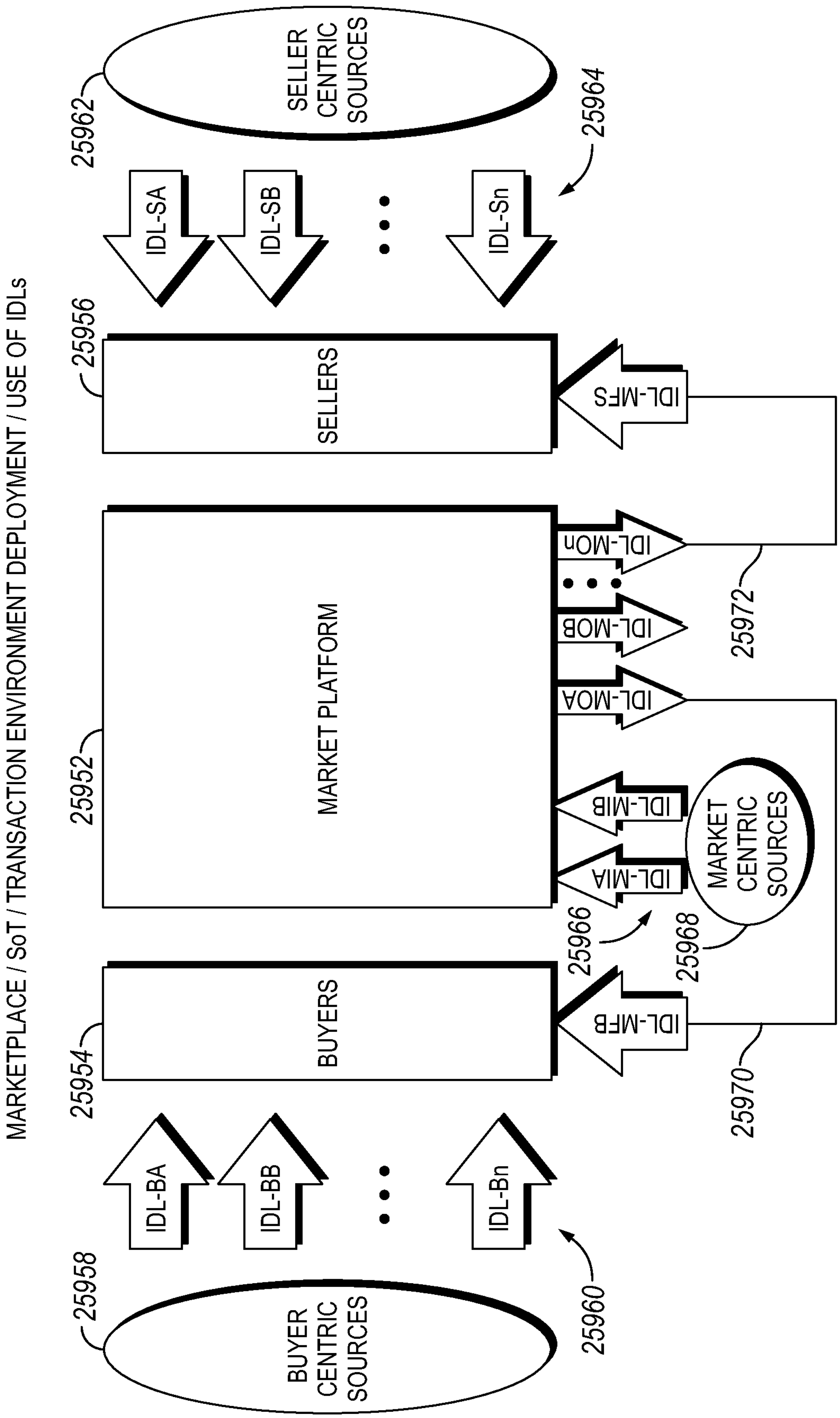

FIG. 268 depicts a block diagram of a marketplace/transaction environment deployment of intelligent data layers.

Figure 269:
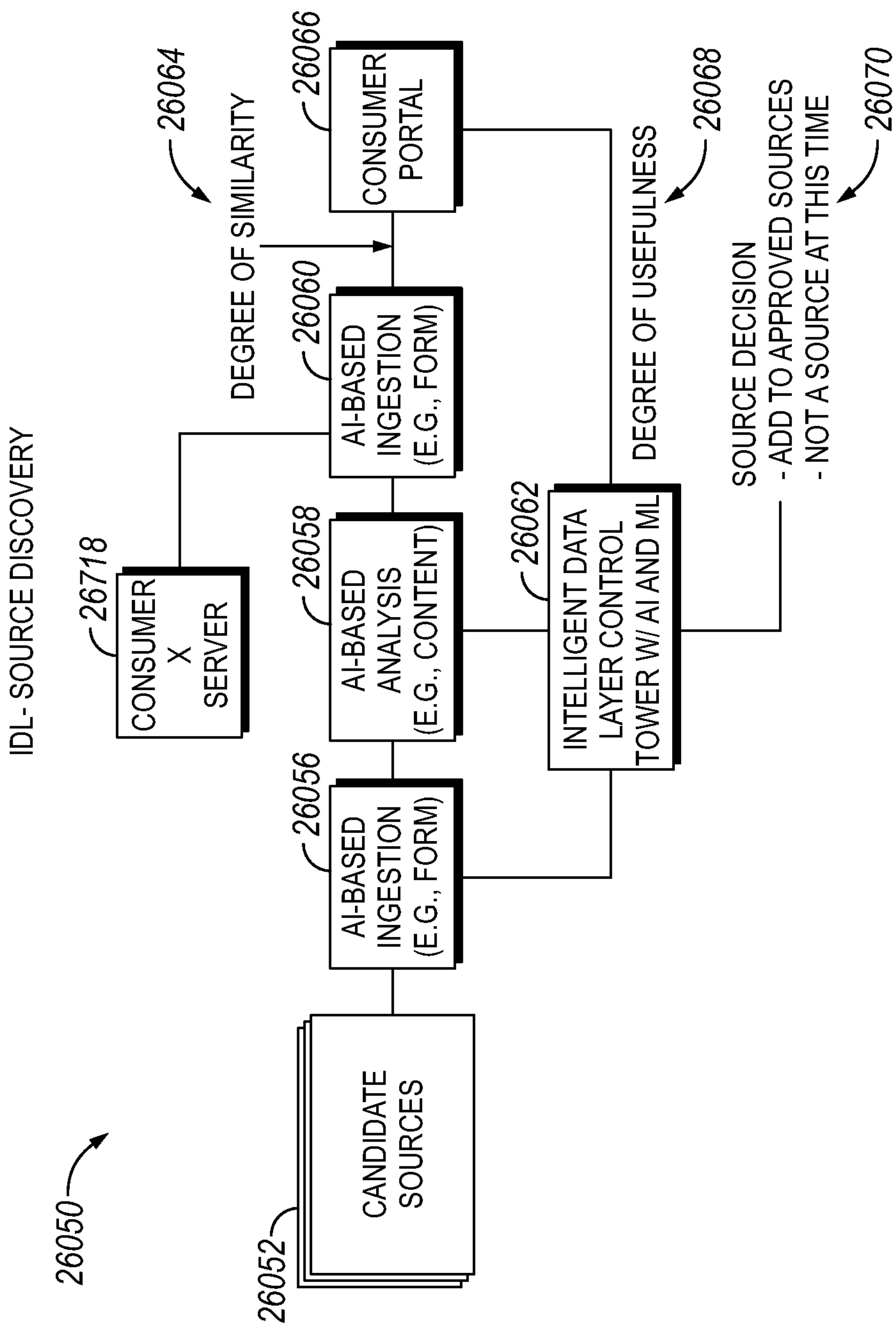

FIG. 269 depicts a block diagram of use of intelligent data layers for source discovery.

Data and networking pipeline for market orchestration FIGS.

FIGS. 270-287 illustrate various features associated with data network and infrastructure pipelines.

Cross-Market Transaction Engine FIGS.

Figure 288:
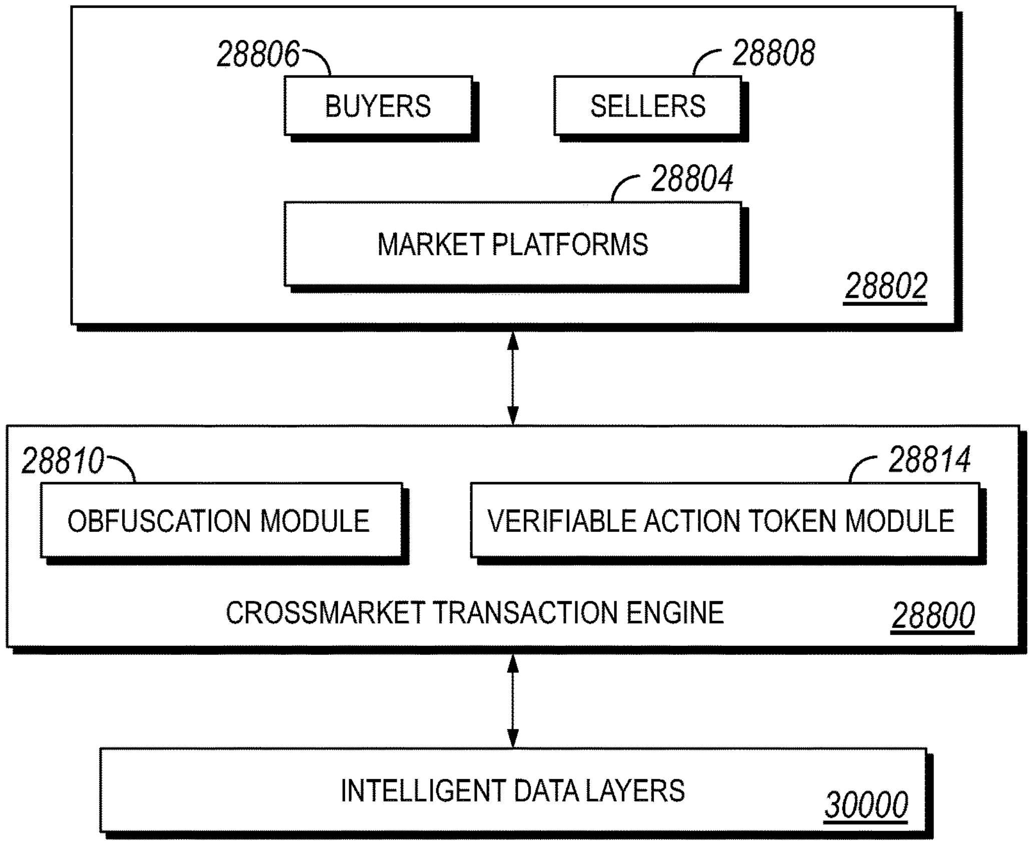

FIG. 288 illustrates an exemplary environment of a cross-market transaction engine according to some embodiments of the present disclosure.

Figure 289:
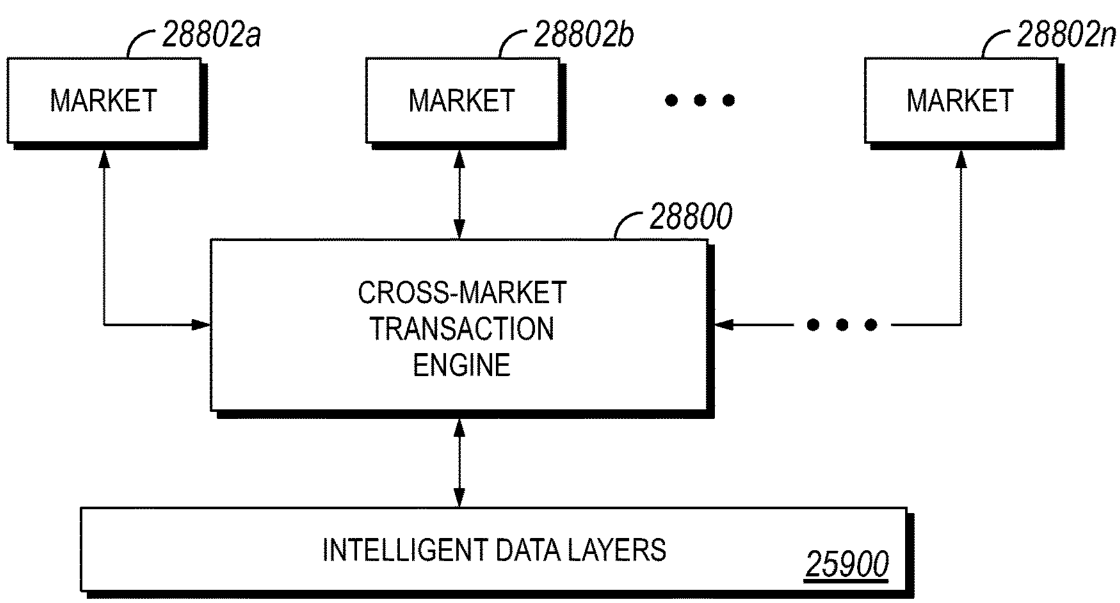

FIG. 289 illustrates another exemplary environment of a cross-market transaction engine according to some embodiments of the present disclosure.

Marketplace Prediction System FIG.

Figure 290:
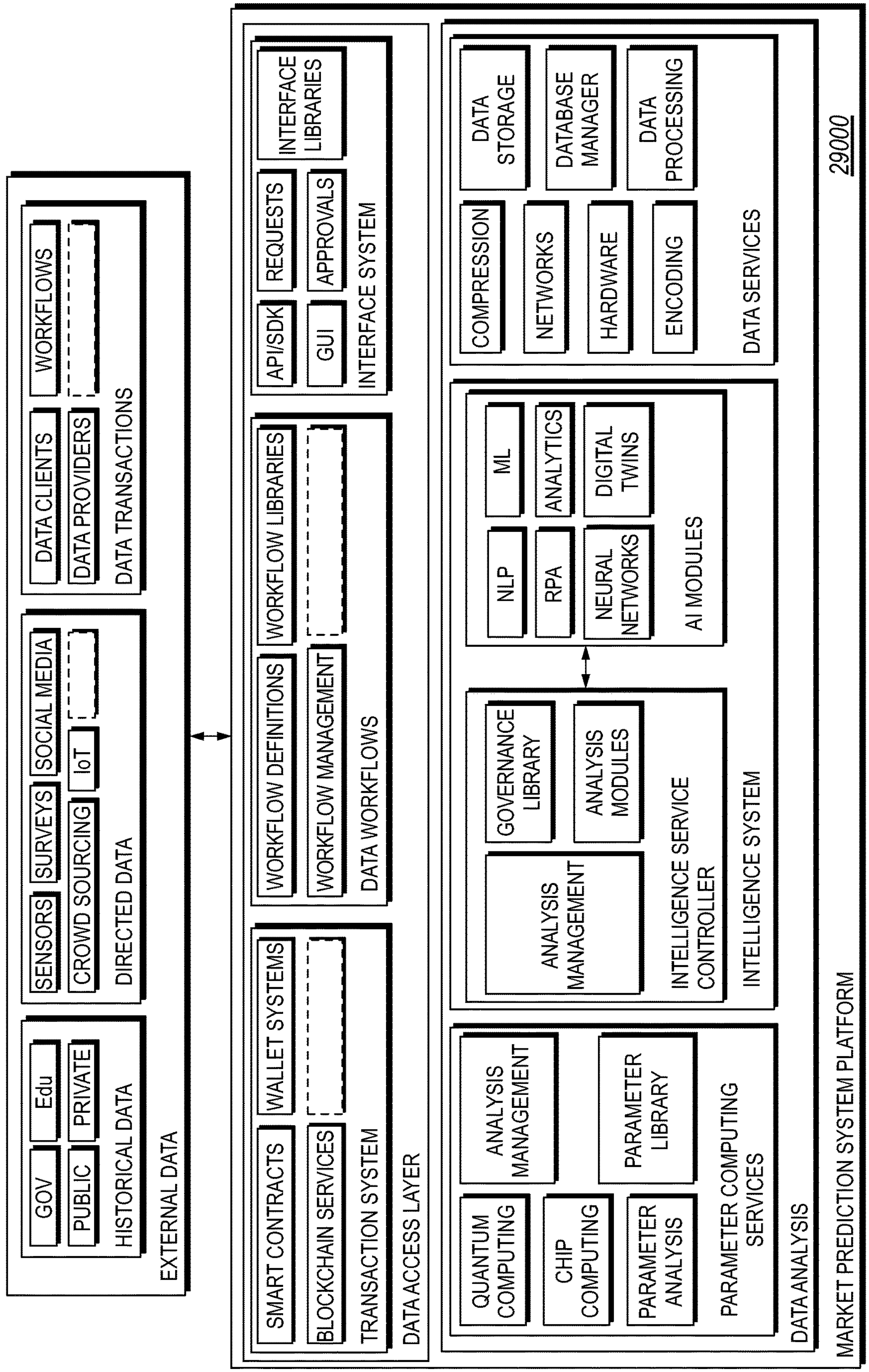

FIG. 290 is a diagrammatic view that illustrates embodiments of the market prediction system platform in accordance with the present disclosure.

Quantum FIGS.

Figure 291:
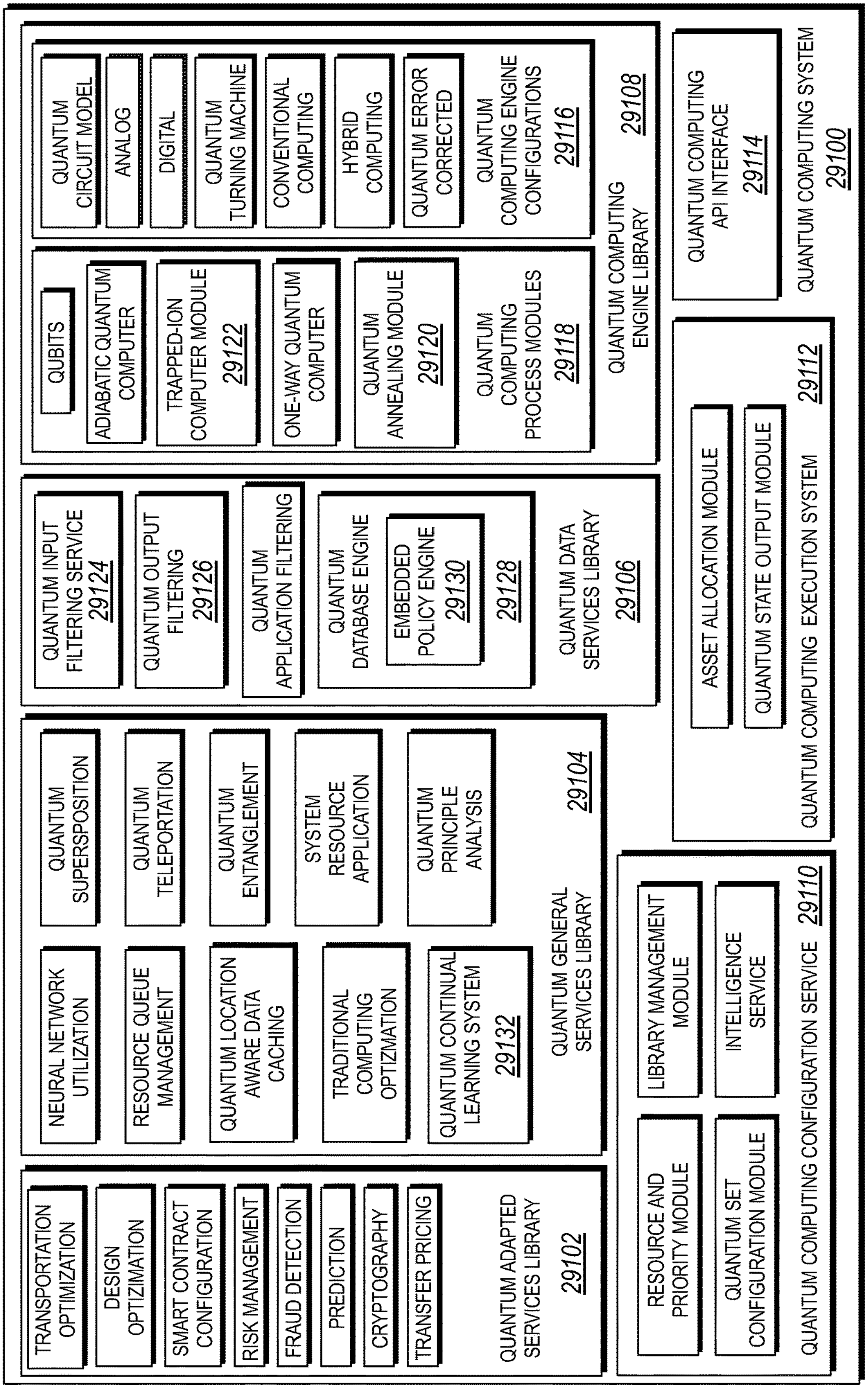

FIG. 291 is a schematic view of an exemplary embodiment of the quantum computing service according to some embodiments of the present disclosure.

Figure 292:
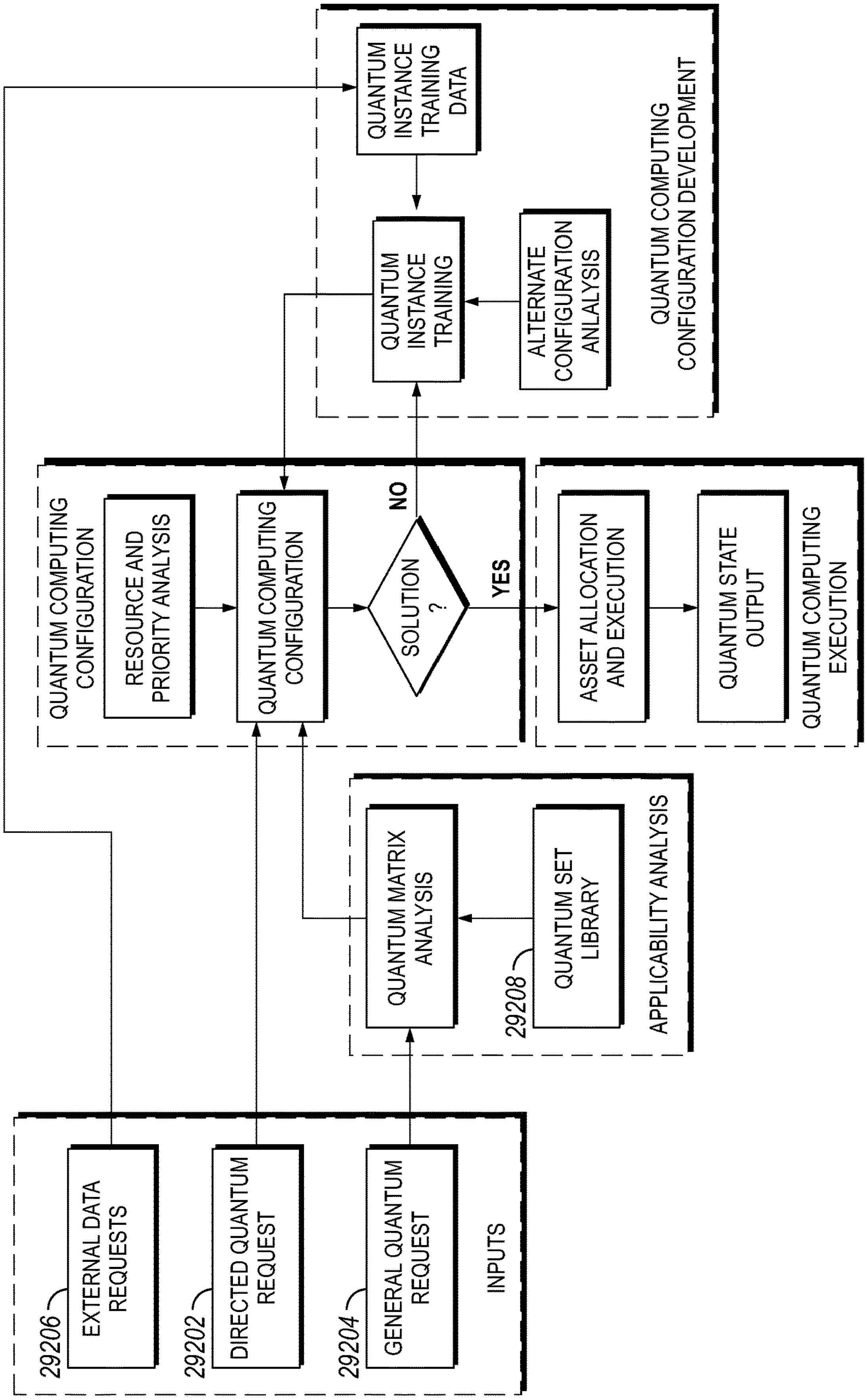

FIG. 292 illustrates quantum computing service request handling according to some embodiments of the present disclosure.

Trust Network FIGS.

FIGS. 293-297 illustrate an example trust network in communication with cryptocurrency transactor computing devices, intermediate transaction systems, and automated transaction systems.

Figure 298:
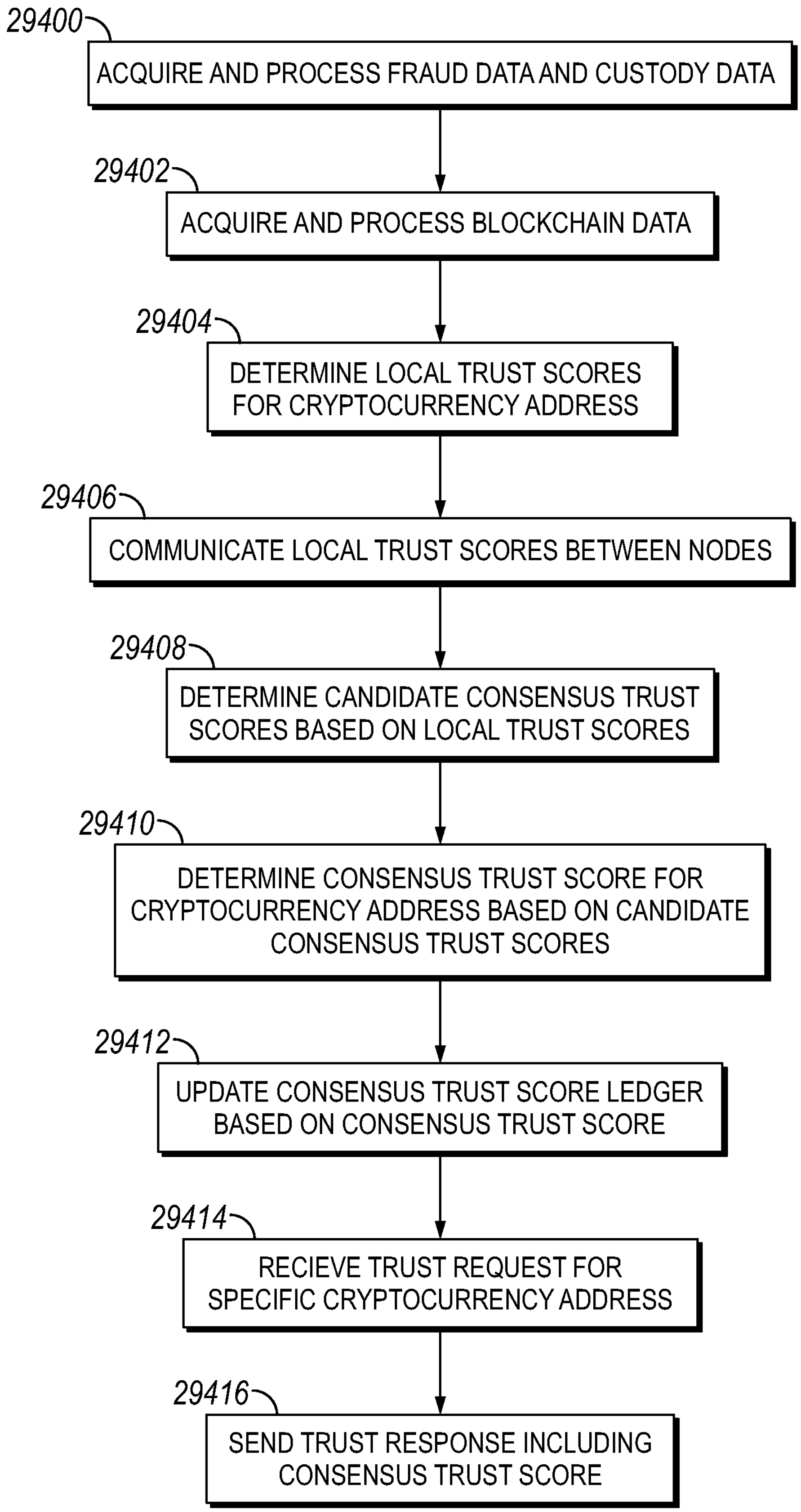

FIG. 298 is a method that describes operation of an example trust network.

Figure 299:
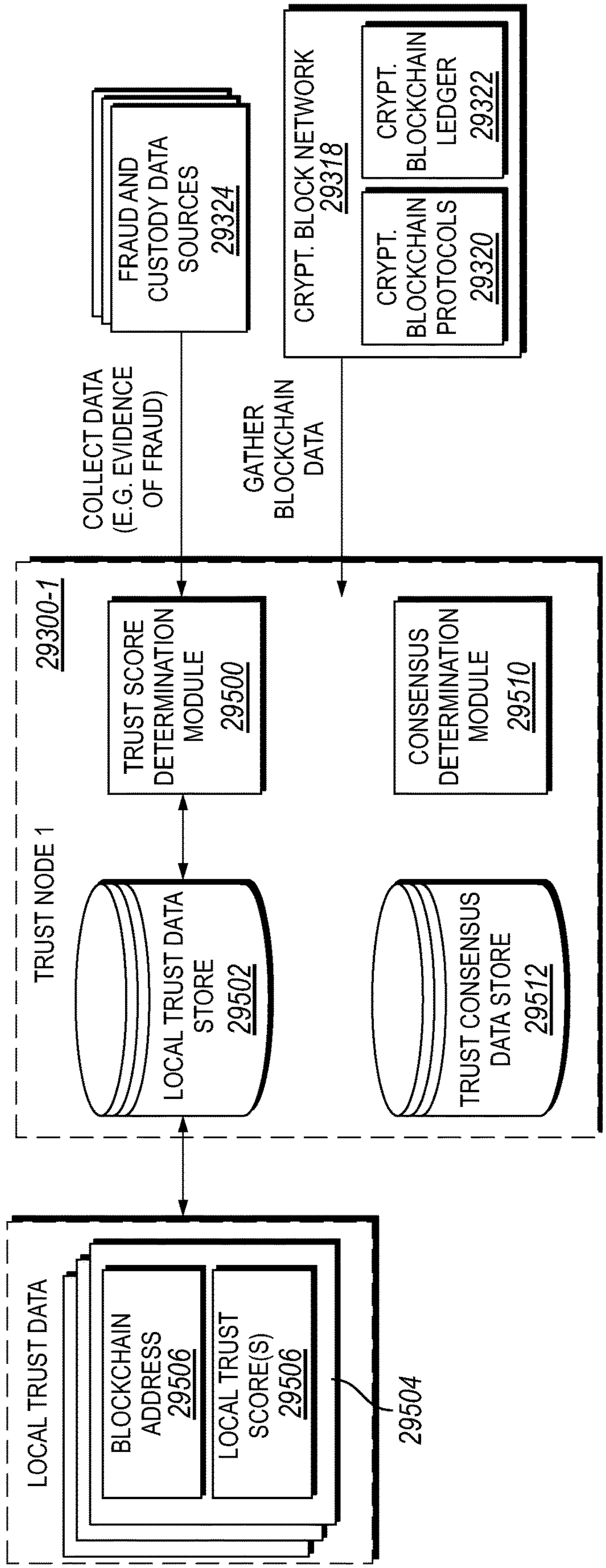

FIG. 299 is a functional block diagram of an example node that calculates local trust scores and consensus trust scores.

Figure 300:
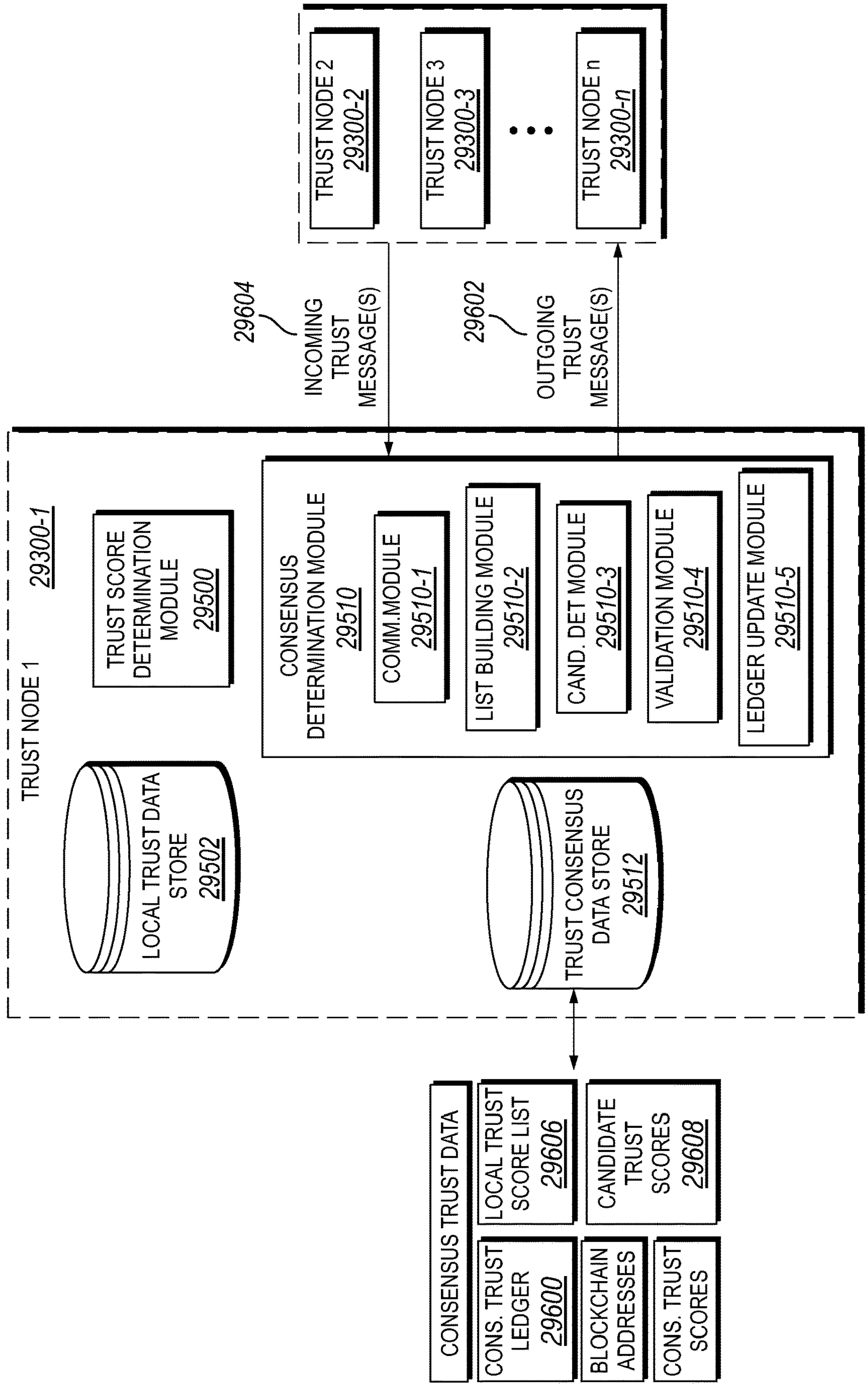

FIG. 300 is a functional block diagram of an example node that calculates consensus trust scores.

Figure 301:
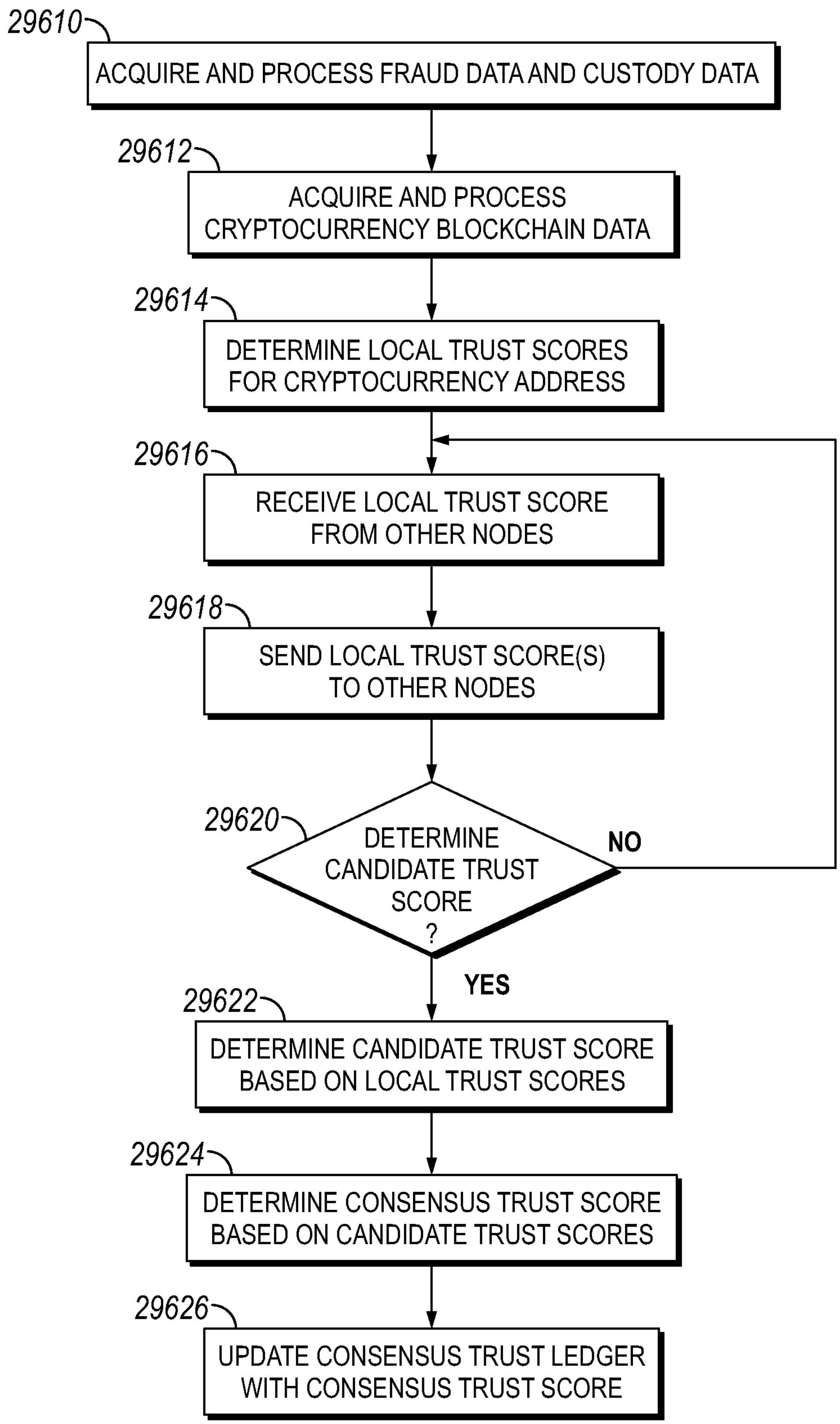

FIG. 301 is a flow diagram that illustrates an example method for calculating a consensus trust score.

Figure 302:
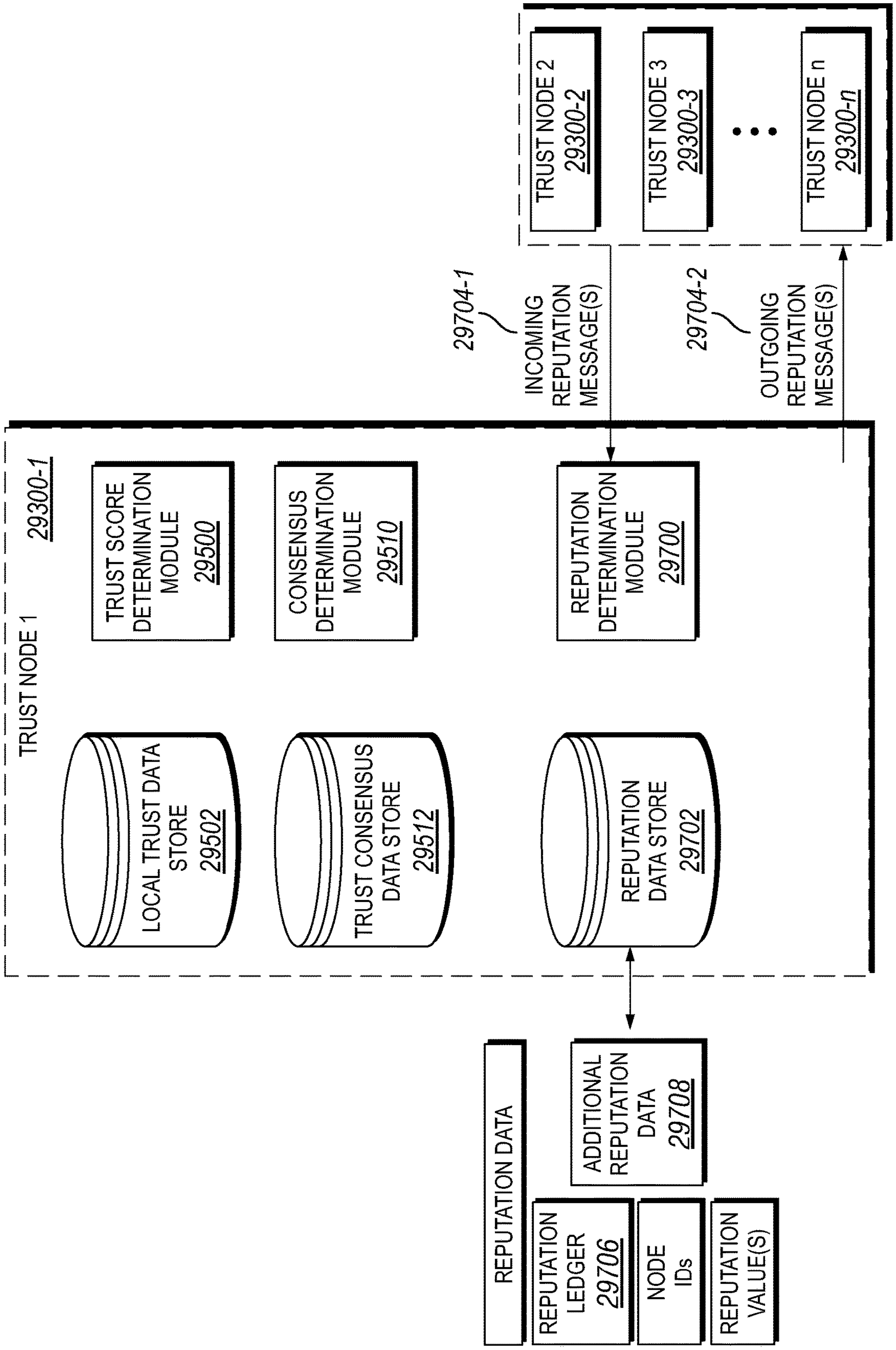

FIG. 302 is a functional block diagram of an example node that calculates reputation values.

Figure 303:
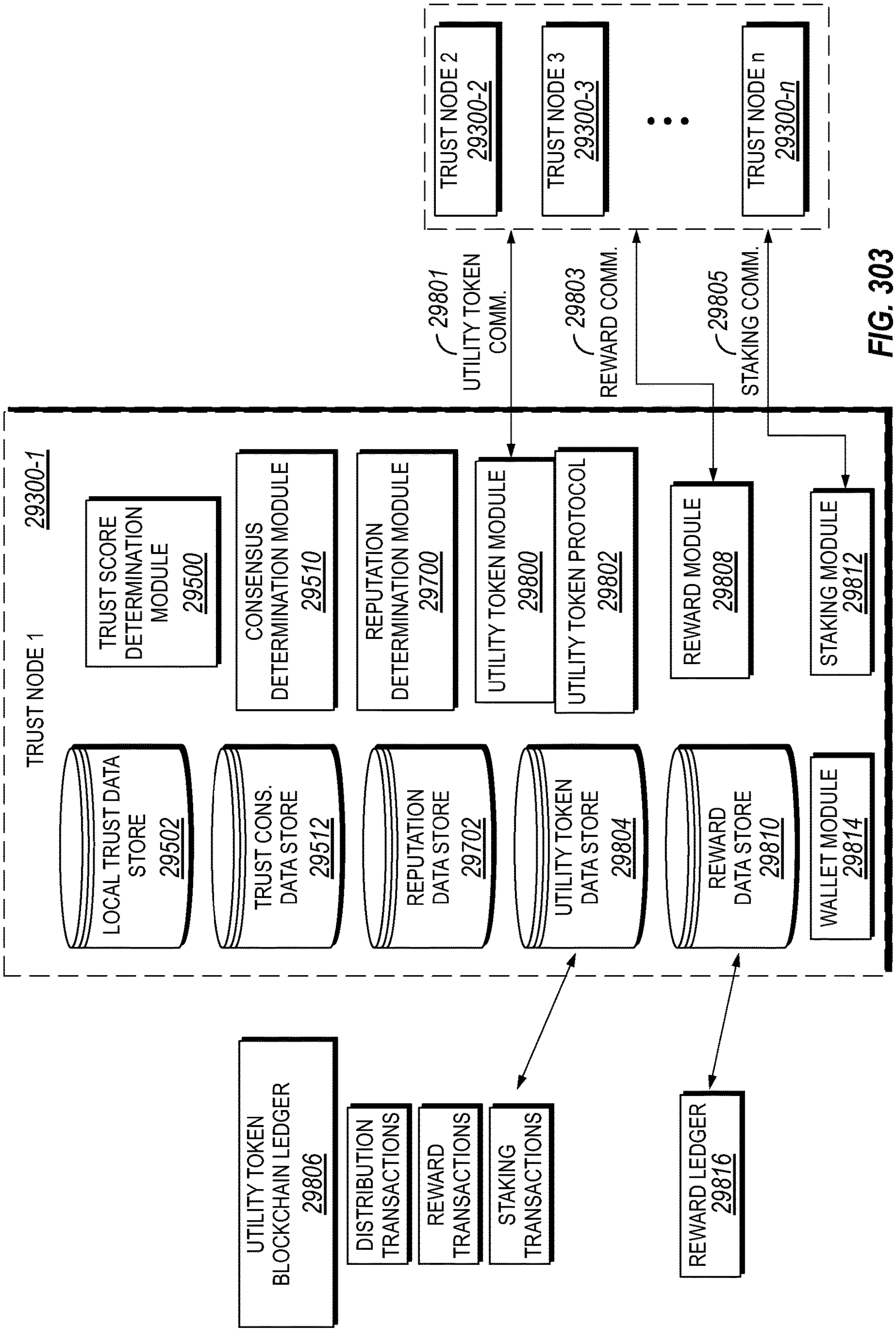

FIG. 303 is a functional block diagram of an example node that implements a token economy for a trust network.

Figure 304:
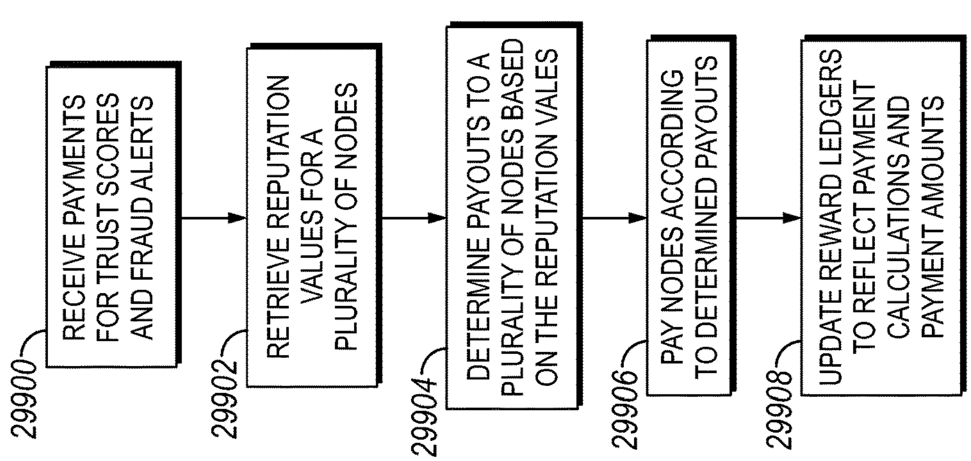

FIG. 304 illustrates an example method that describes operation of a reward protocol.

Figure 305:
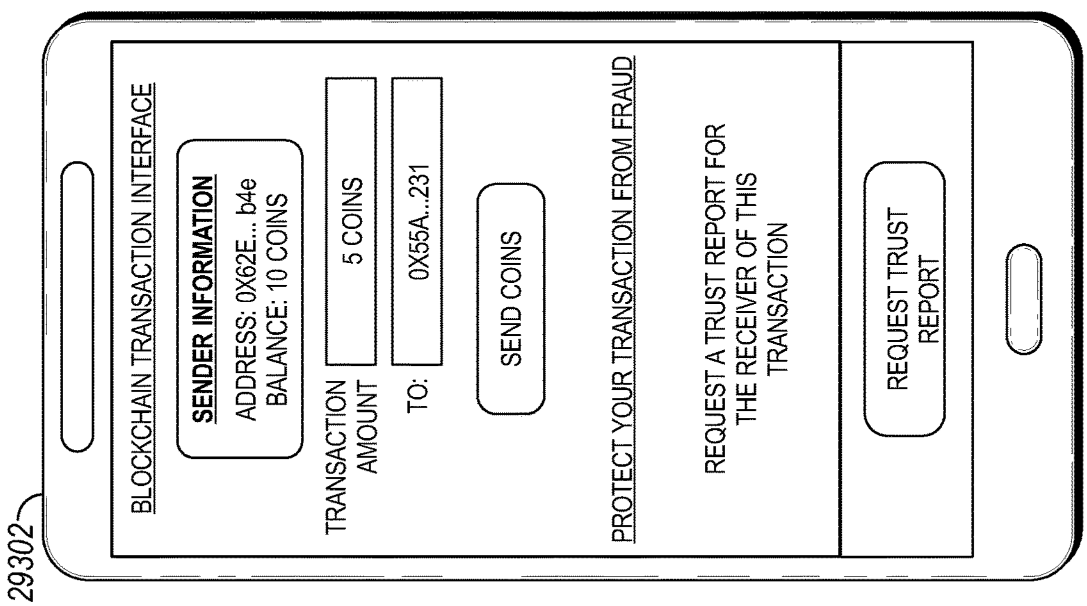
Figure 306:
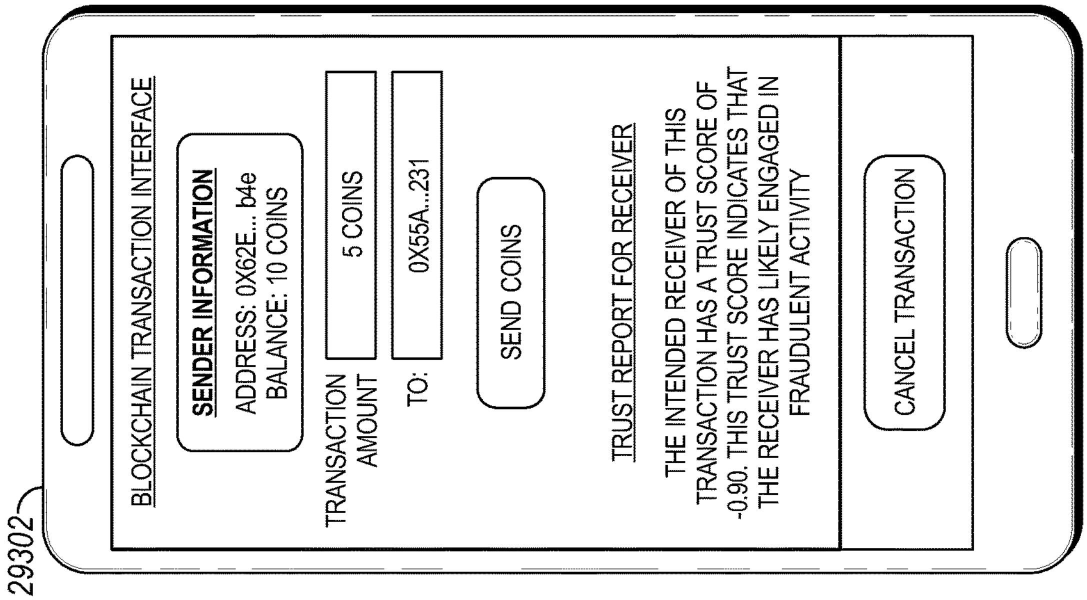

FIGS. 305-306 illustrate graphical user interfaces (GUIs) for requesting and reviewing trust reports.

Figures 307, 308:
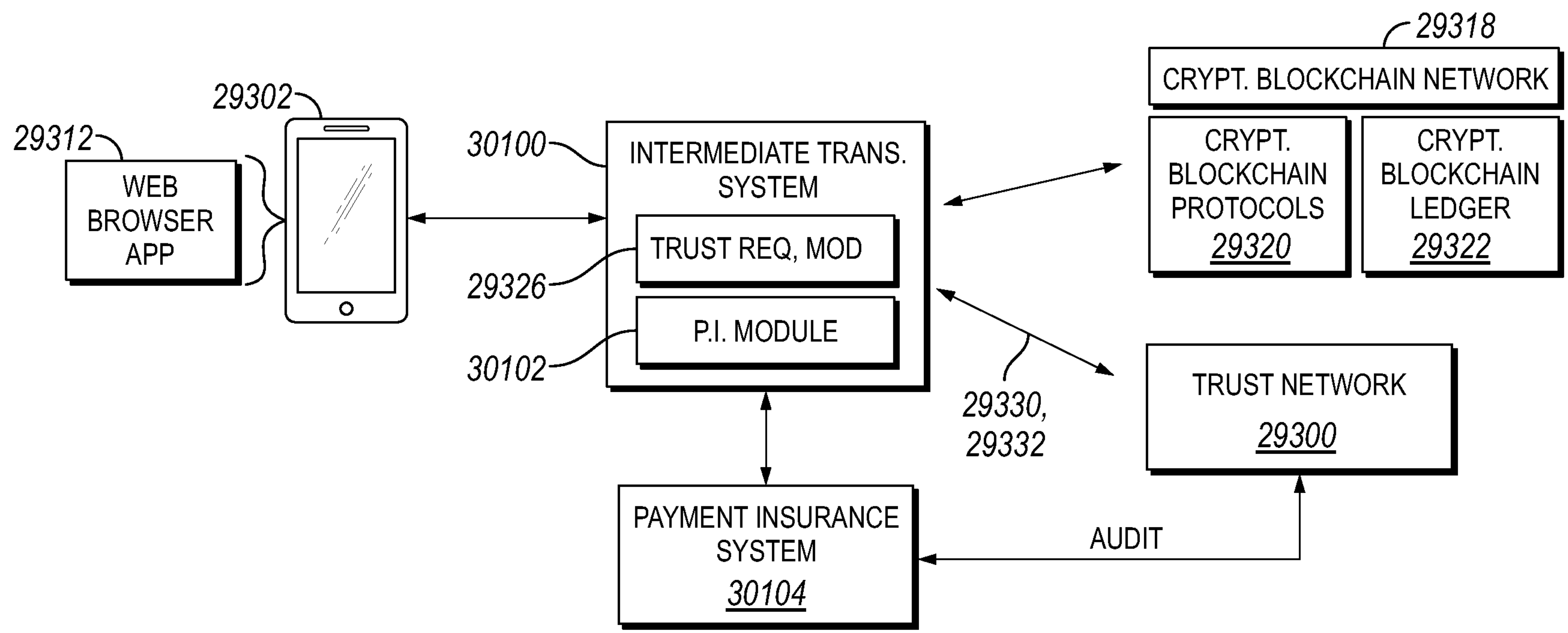

FIG. 307 is a functional block diagram of a trust network being used in a payment insurance implementation.

FIG. 308 illustrates an example relationship of staked token and consensus trust score cost.

FIG. 309 illustrates example services associated with different levels of nodes.

FIG. 310 illustrates an example relationship between the number of nodes, the number of cliques, the address overlap, and the probability that a node will get a single address in their control.

FIG. 311 illustrates sample token staking amounts and number of nodes.

Figure 312:
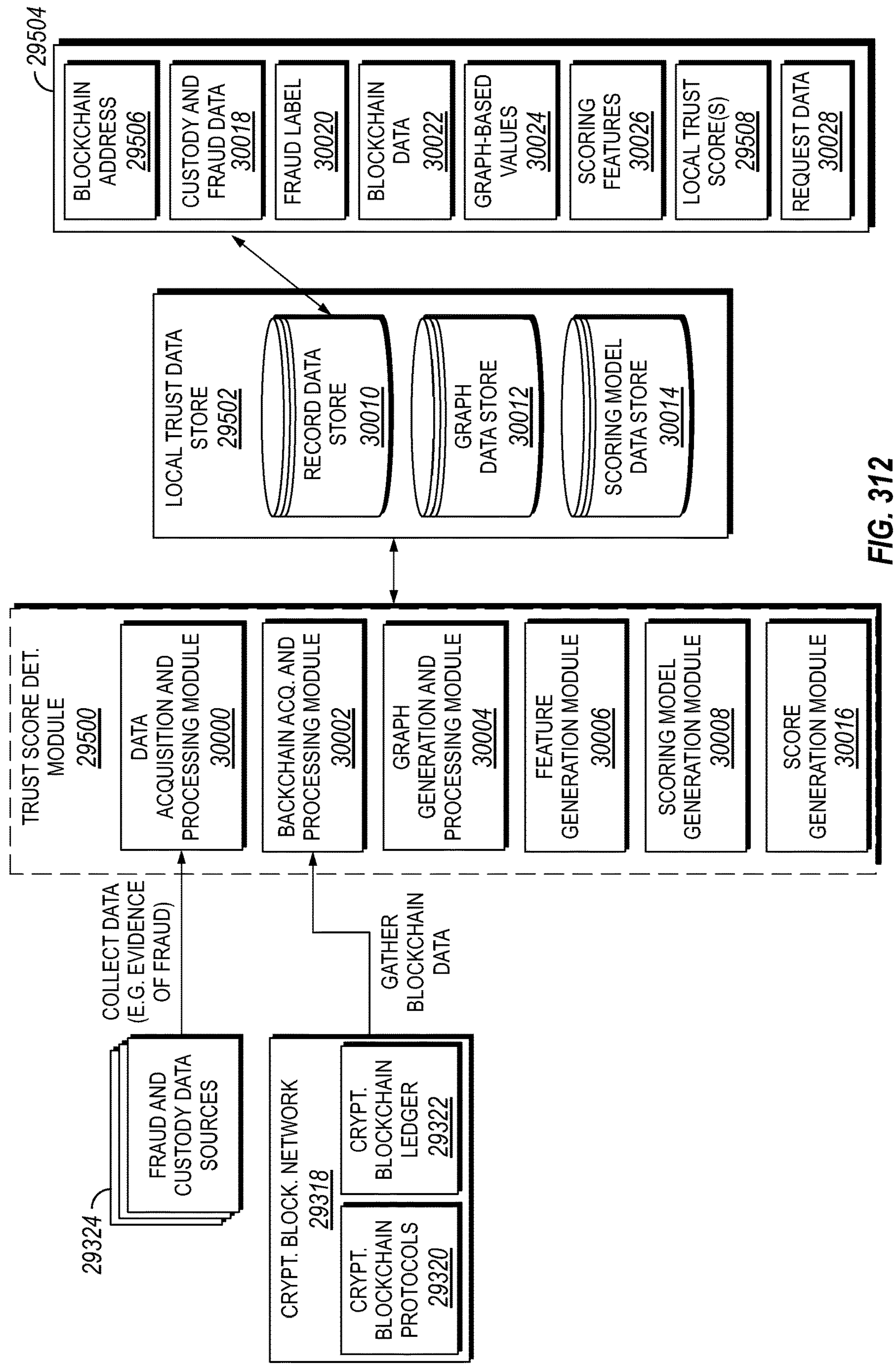

FIG. 312 is a functional block diagram of an example trust score determination module and local trust data store.

Figure 313:
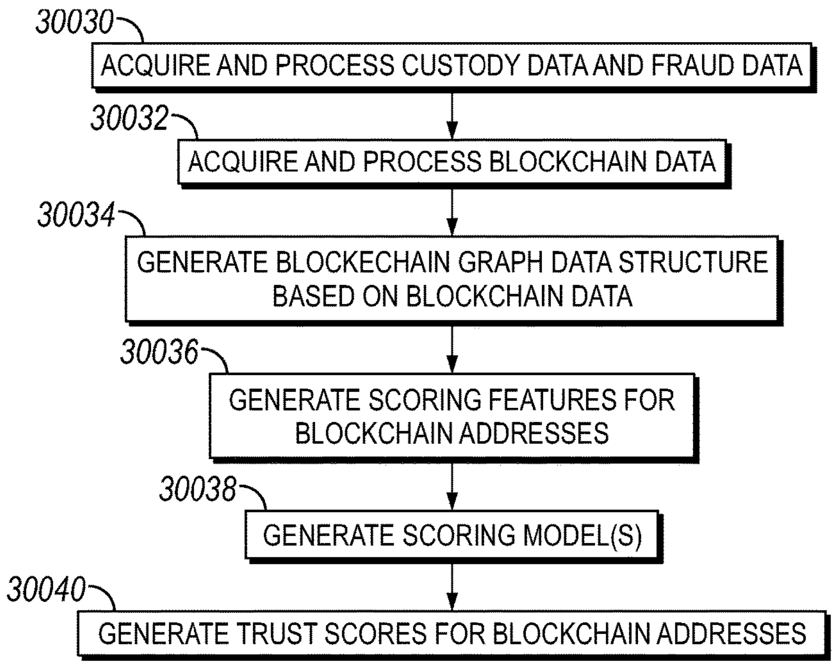

FIG. 313 is a method that describes operation of an example trust score determination module.

Figure 314:
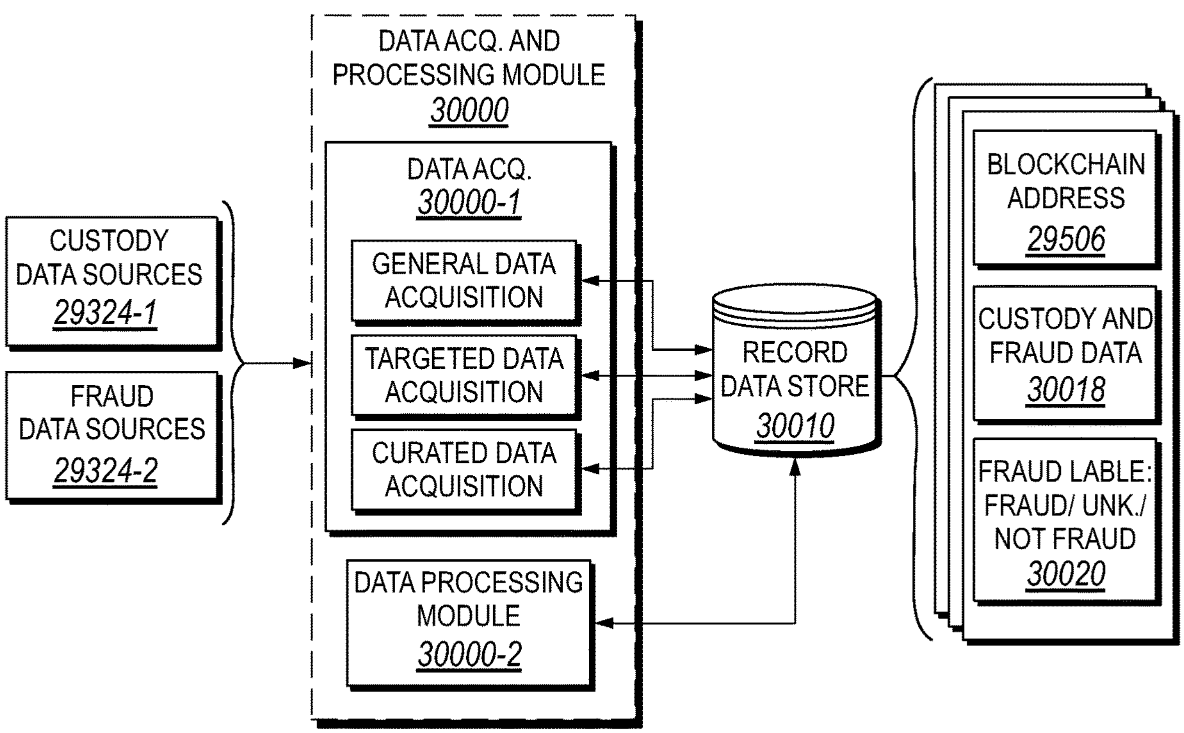

FIG. 314 is a functional block diagram of a data acquisition and processing module.

Figure 315:
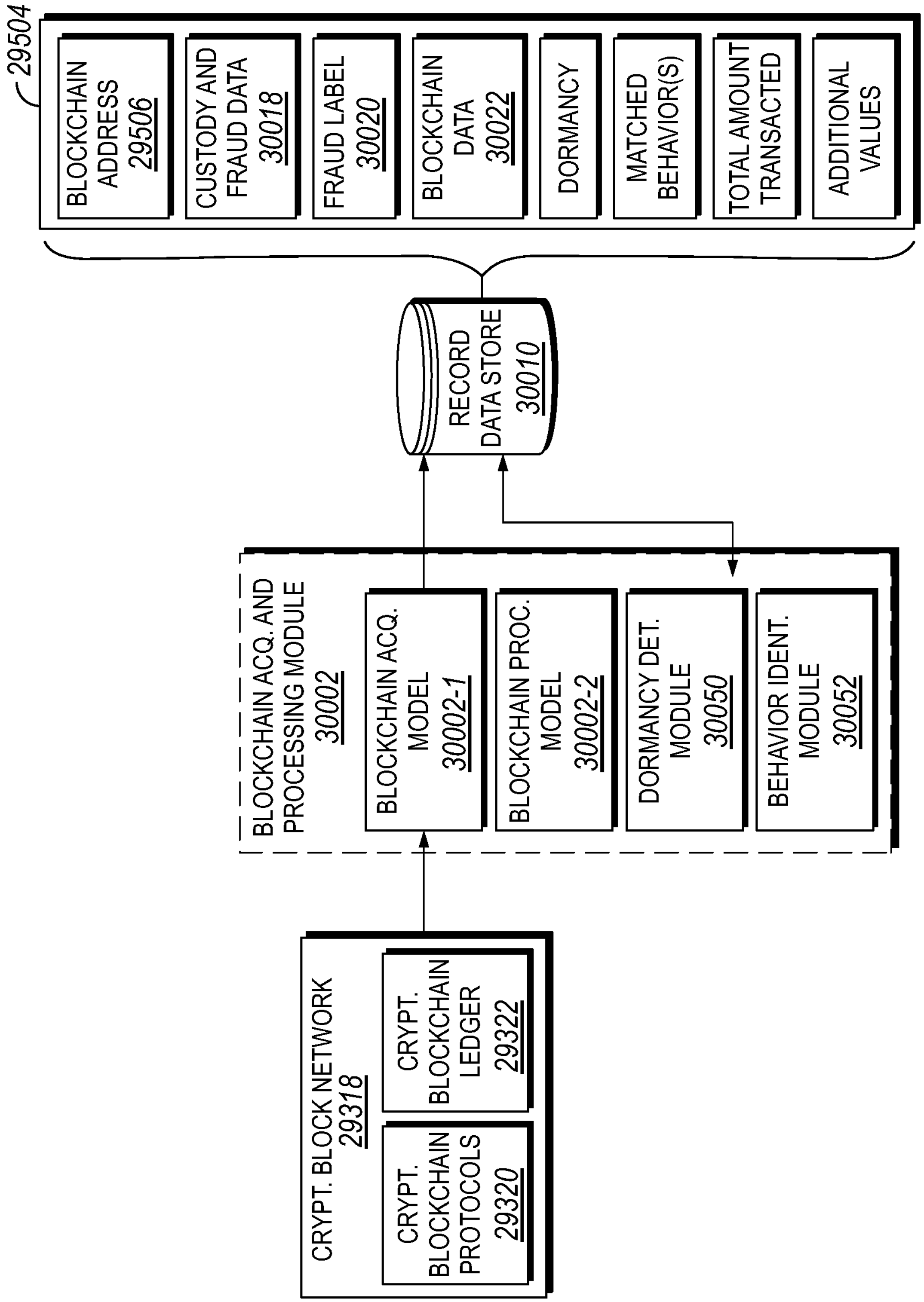

FIG. 315 is a functional block diagram of a blockchain data acquisition and processing module.

Figure 316:
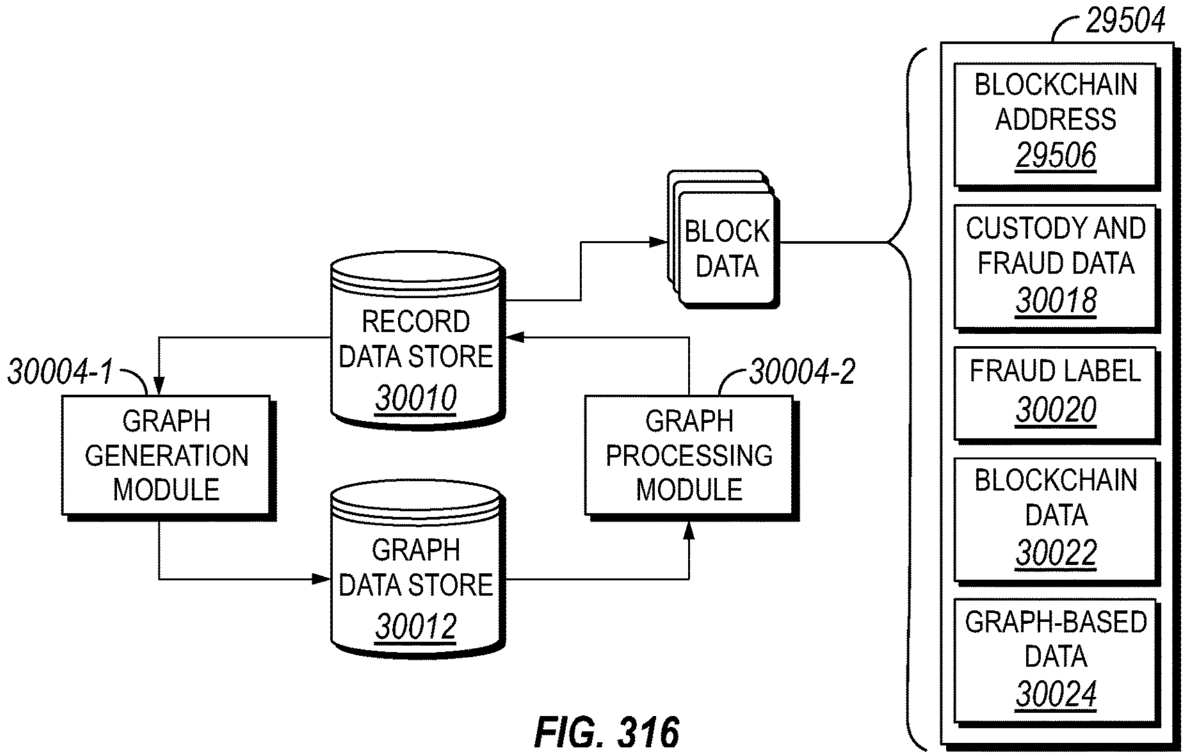
Figure 317:
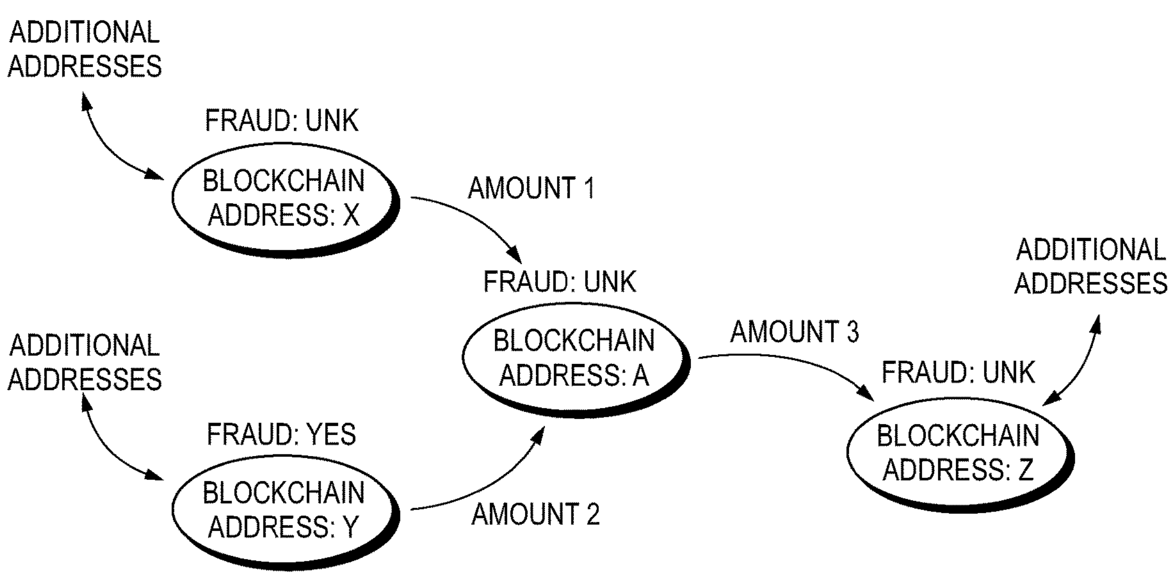

FIGS. 316-317 illustrate generation and processing of a blockchain graph data structure.

Figure 318:
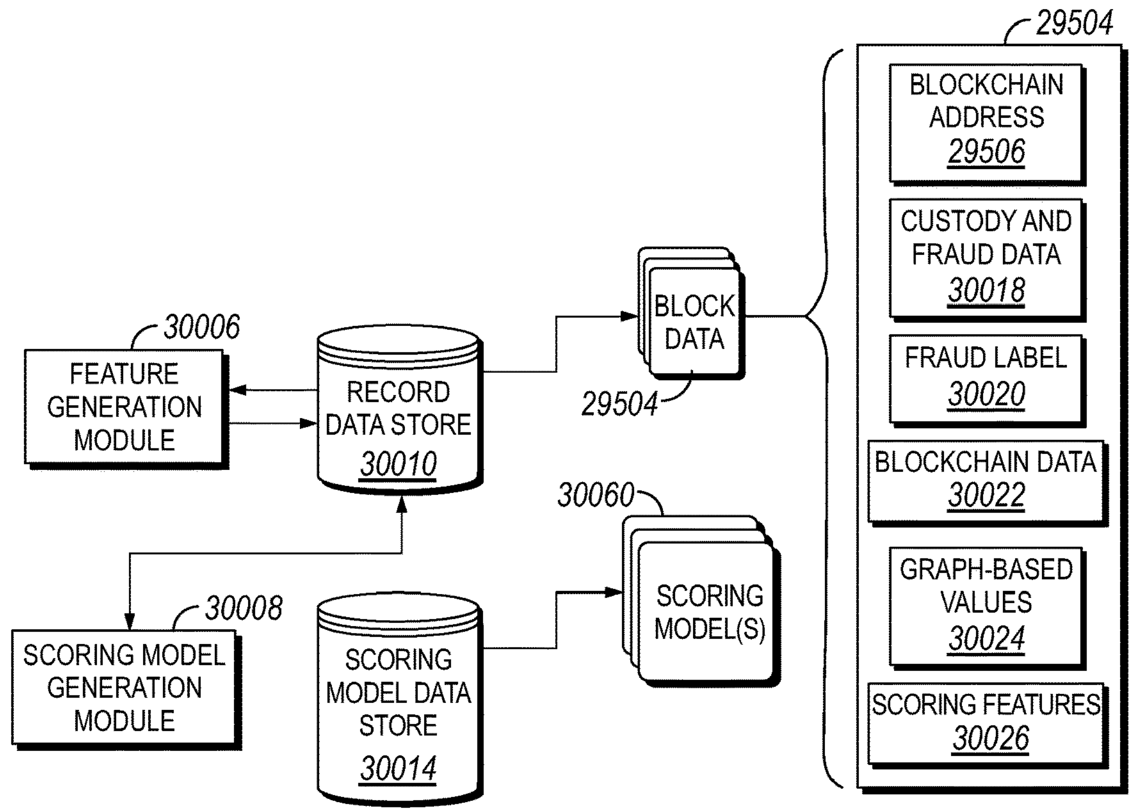

FIG. 318 is a functional block diagram of a scoring feature generation module and a scoring model generation module.

Figure 319:
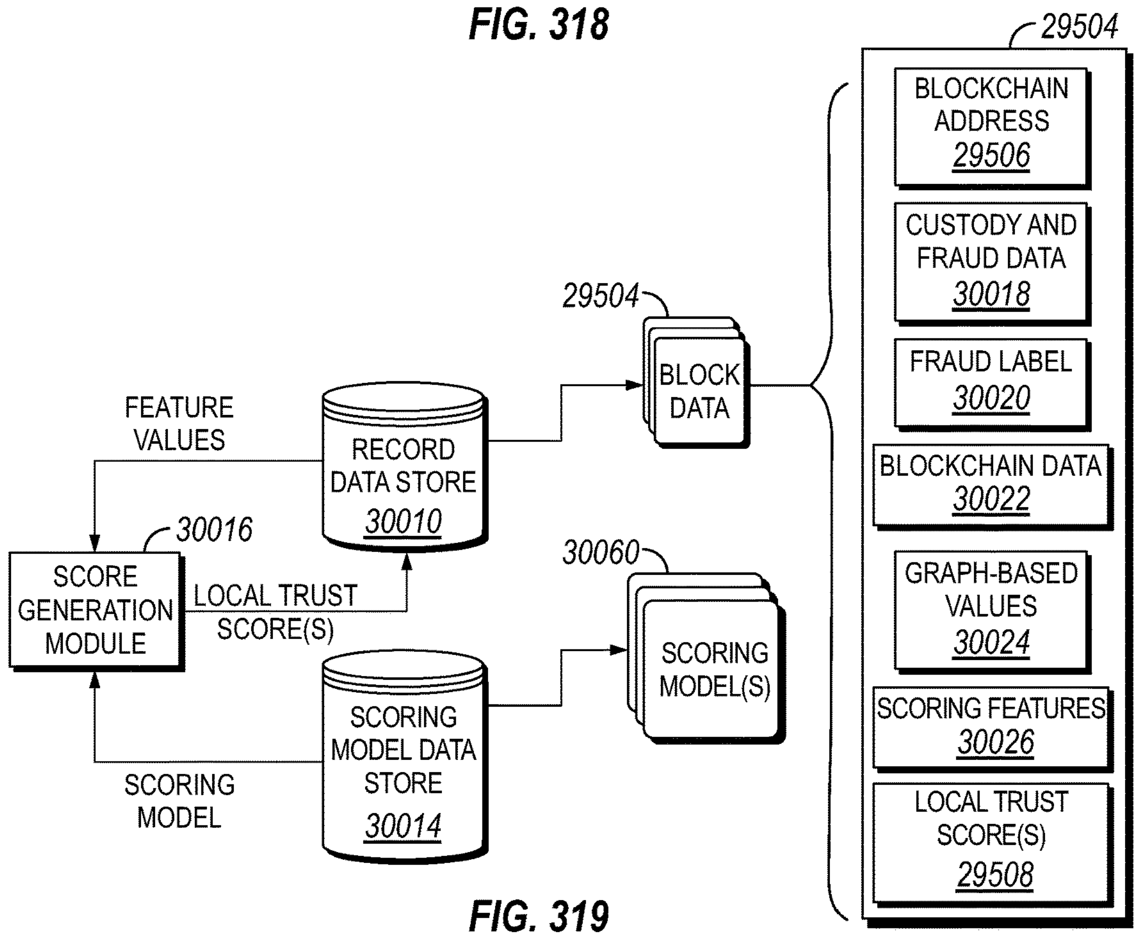

FIG. 319 is a functional block diagram that illustrates operation of a score generation module.

Figure 320:
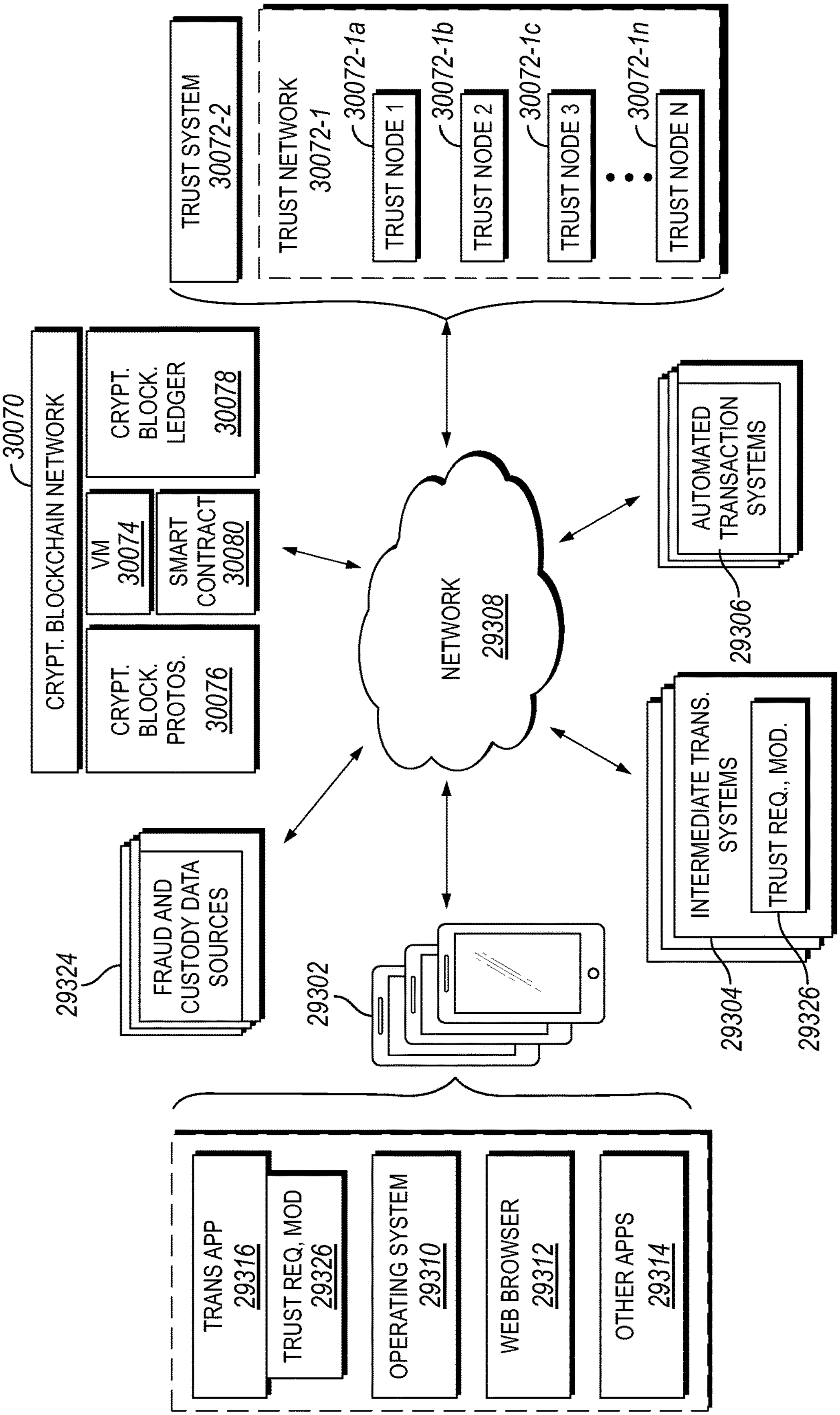

FIG. 320 illustrates an environment that includes a cryptocurrency blockchain network that executes smart contracts.

Figure 321:
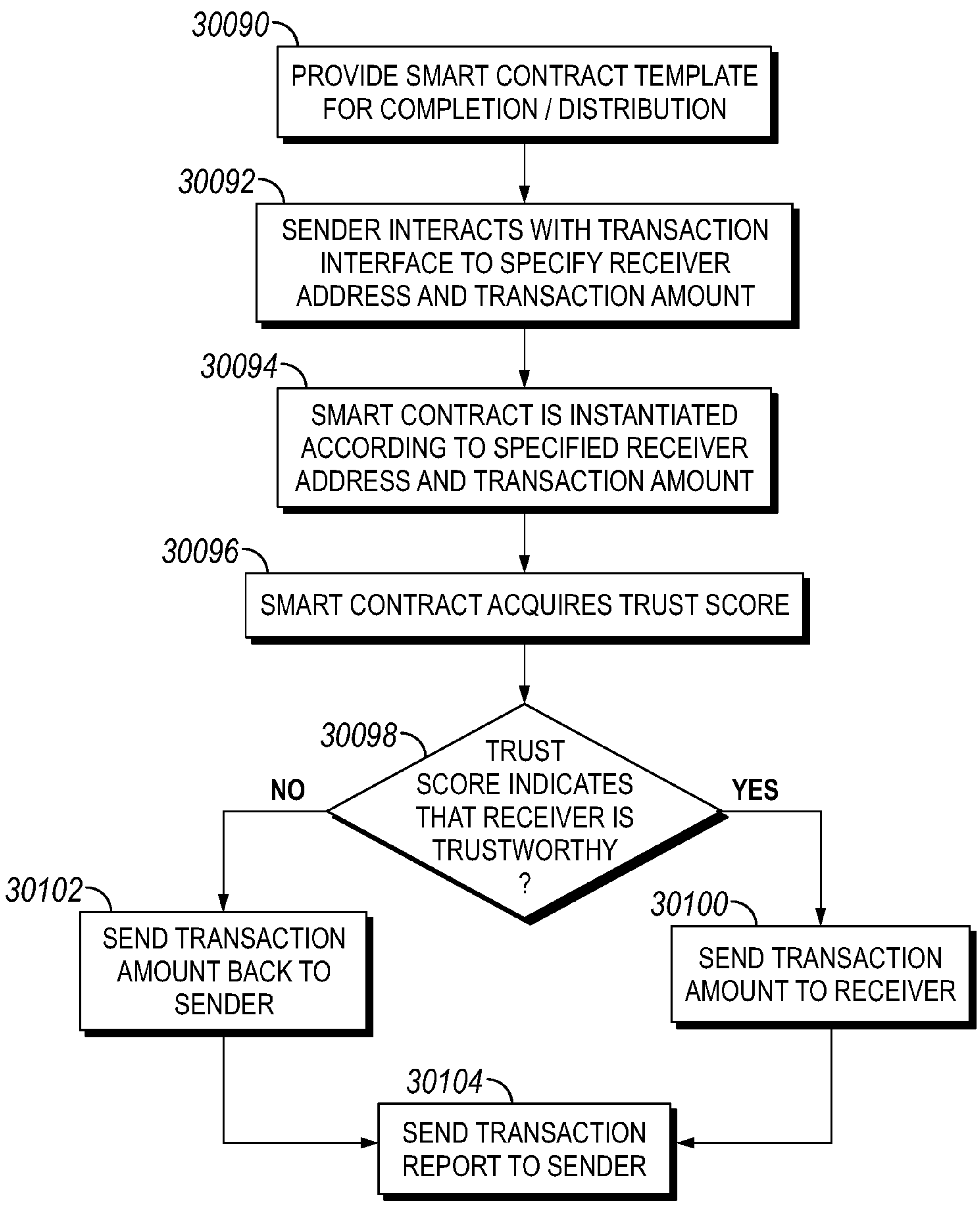

FIG. 321 illustrates a method that describes operation of the environment of FIG. 320.

Figure 322:
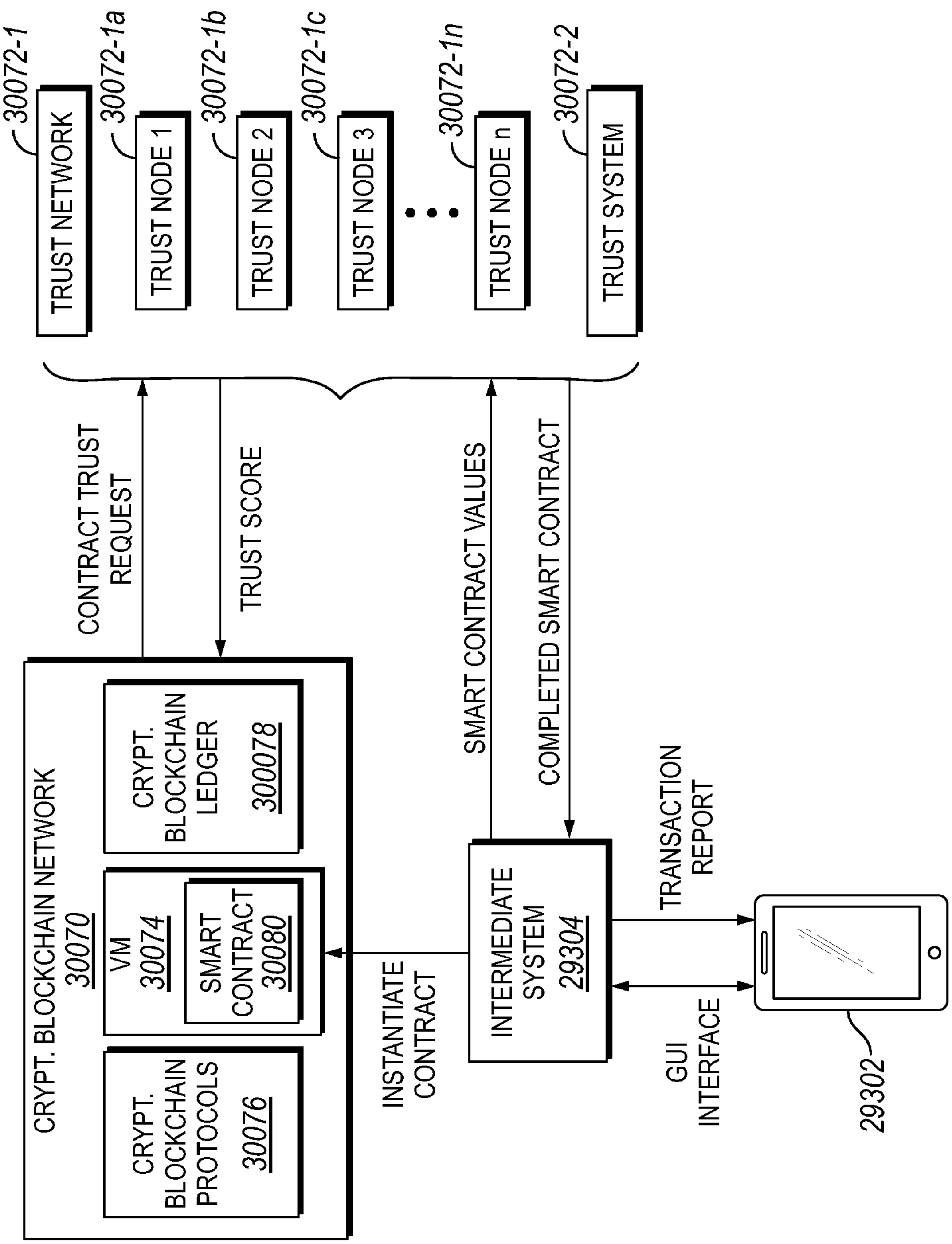

FIG. 322 is a functional block diagram that illustrates interactions between a sender user device, an intermediate transaction system, a blockchain network, and a trust network/system.

Figure 323:
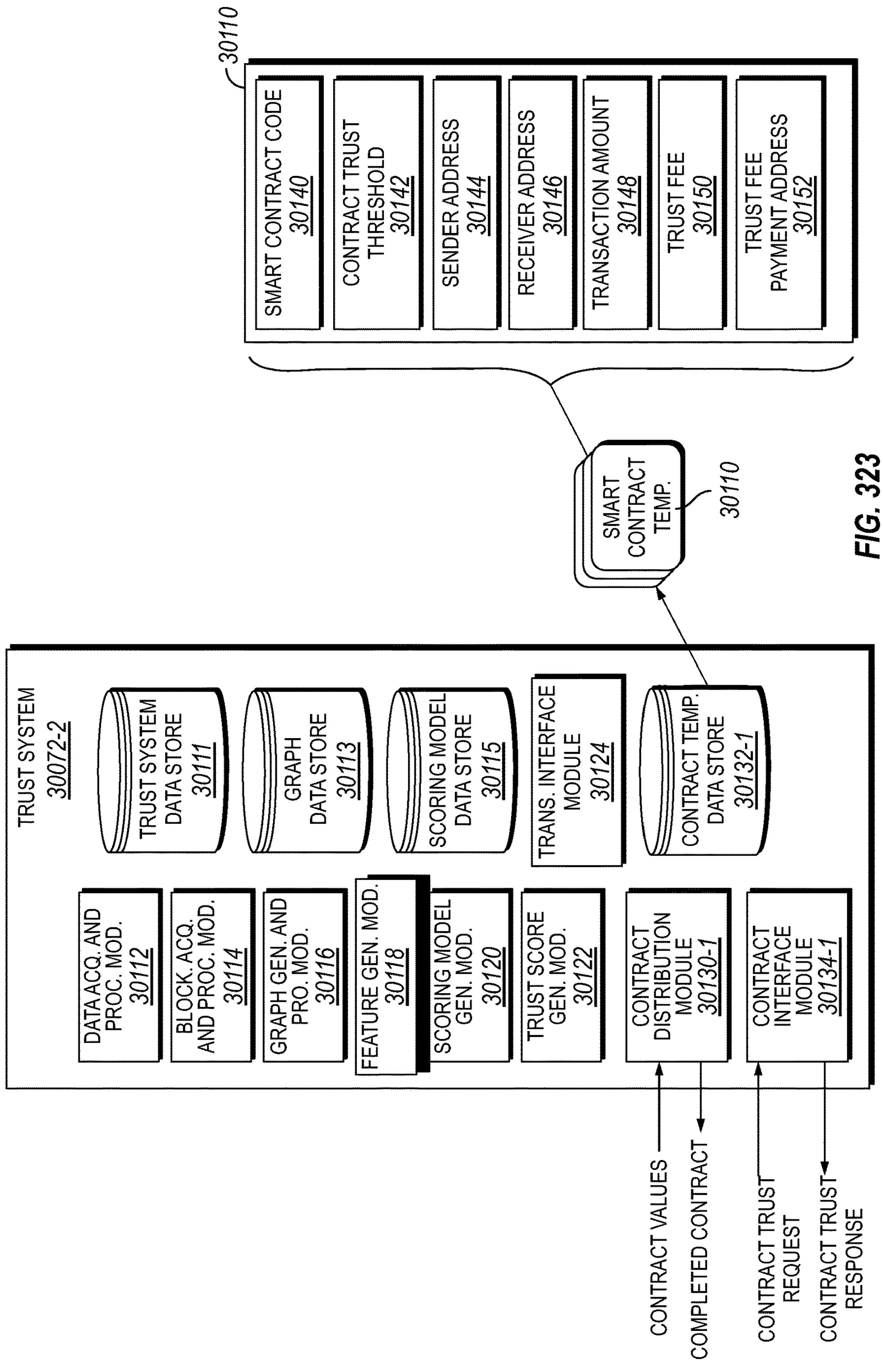
Figure 324:
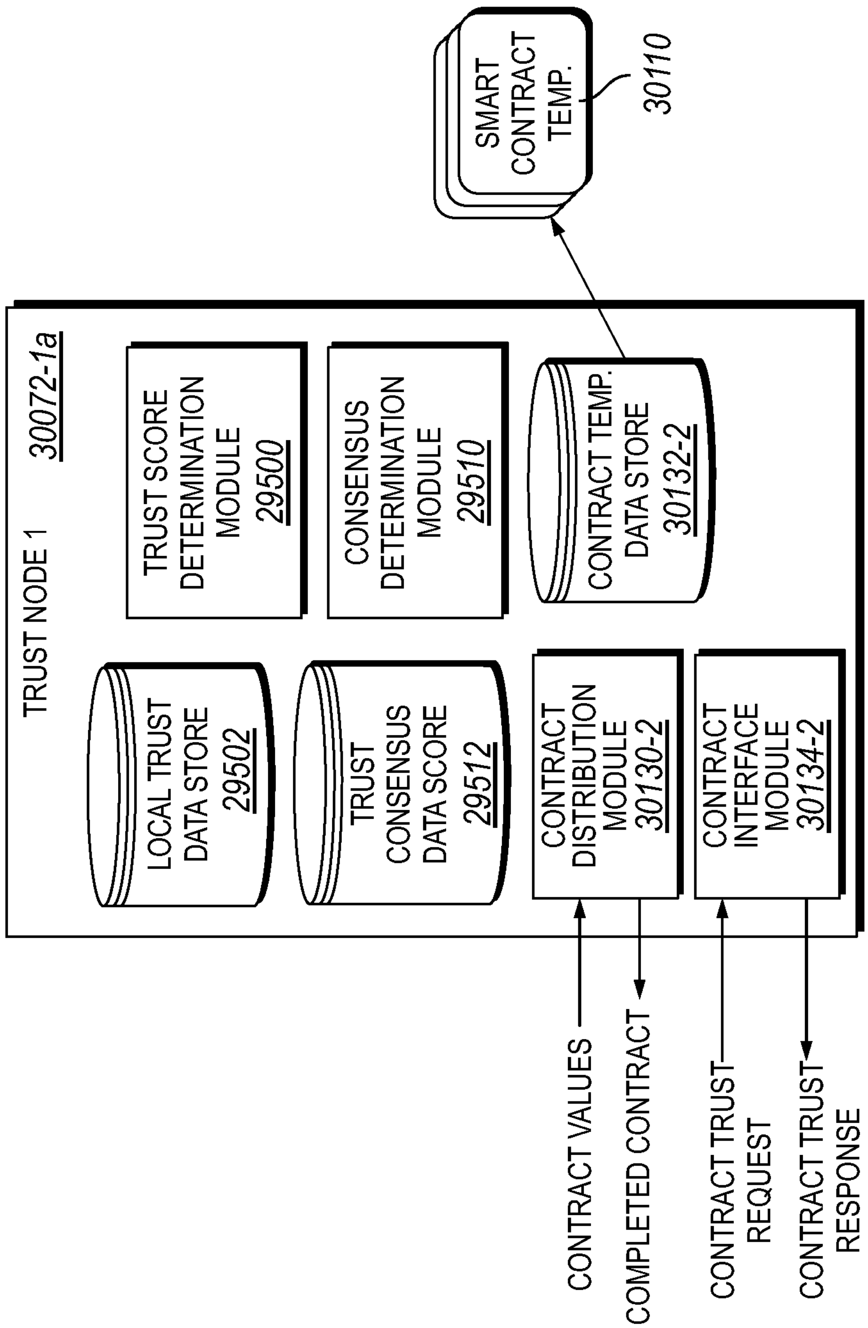

FIGS. 323-324 illustrate an example trust system and an example trust node that can determine trust scores for blockchain addresses.

Figure 325:
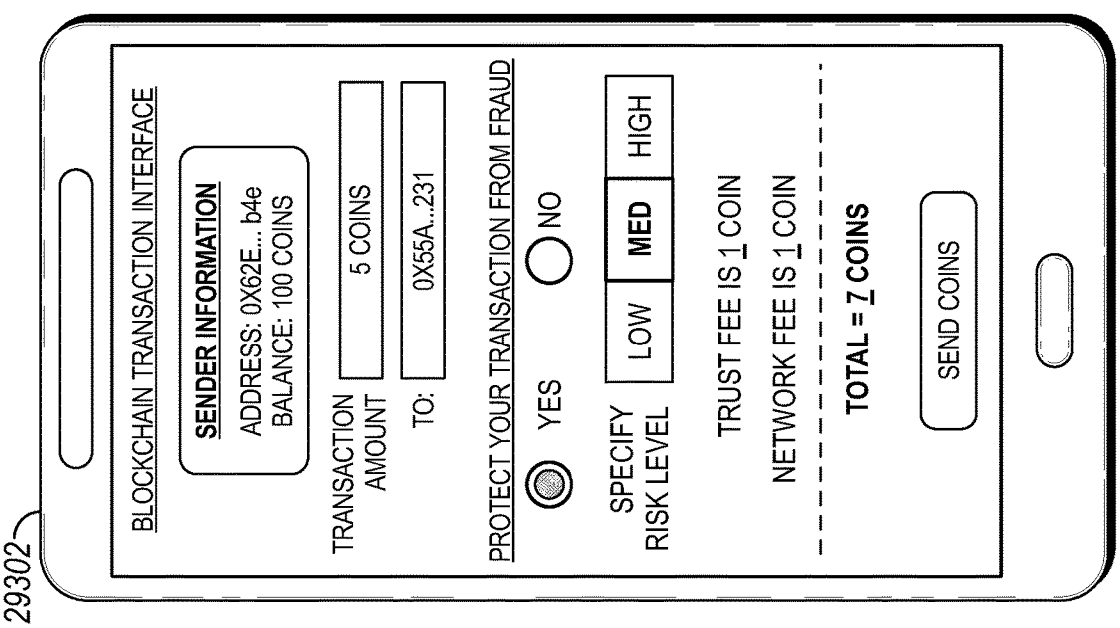
Figure 326:
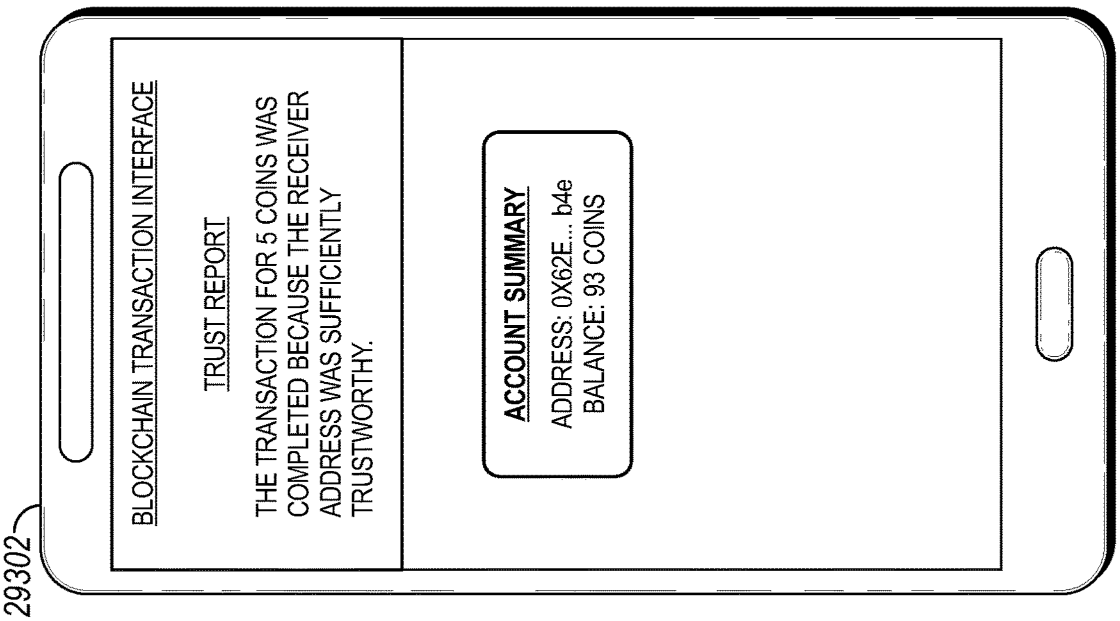

FIGS. 325-326 illustrate an example sender interface on a user device.

Figure 327:
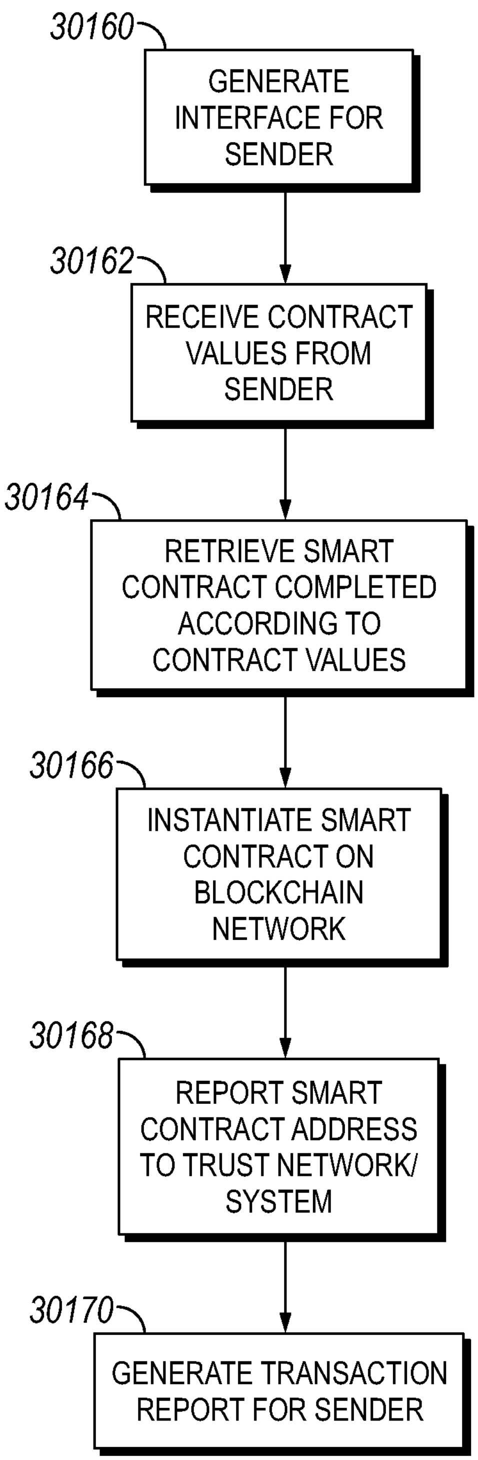

FIG. 327 illustrates an example method describing operation of an intermediate transaction system.

Figure 328:
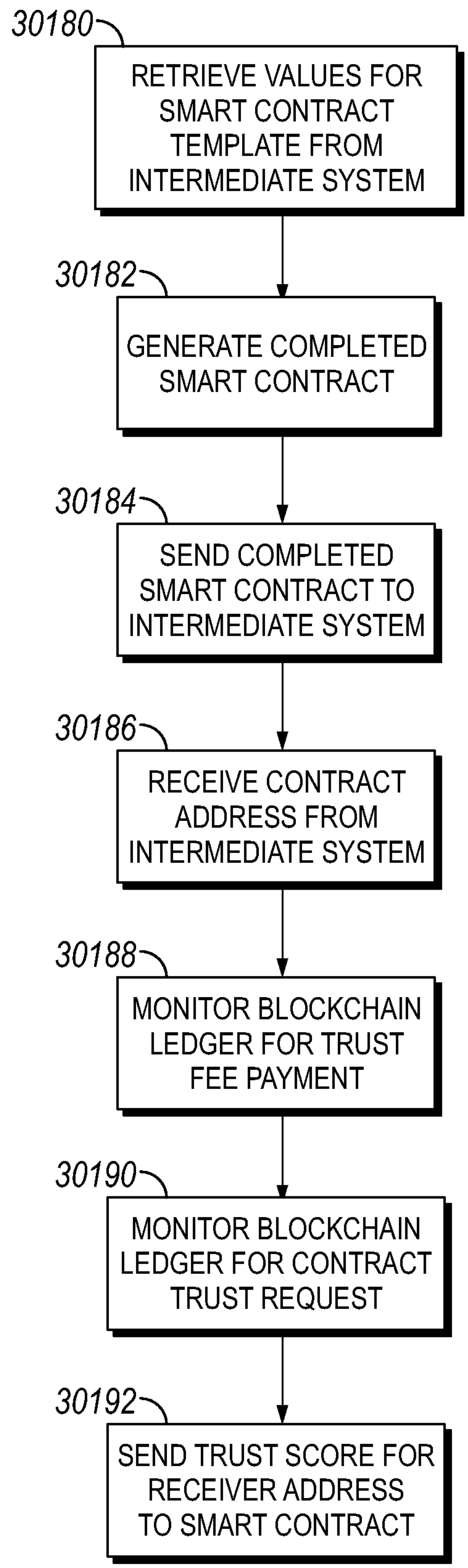

FIG. 328 illustrates an example method describing operation of a trust network/system.

Dual Process Artificial Neural Network Figures

Figure 329:
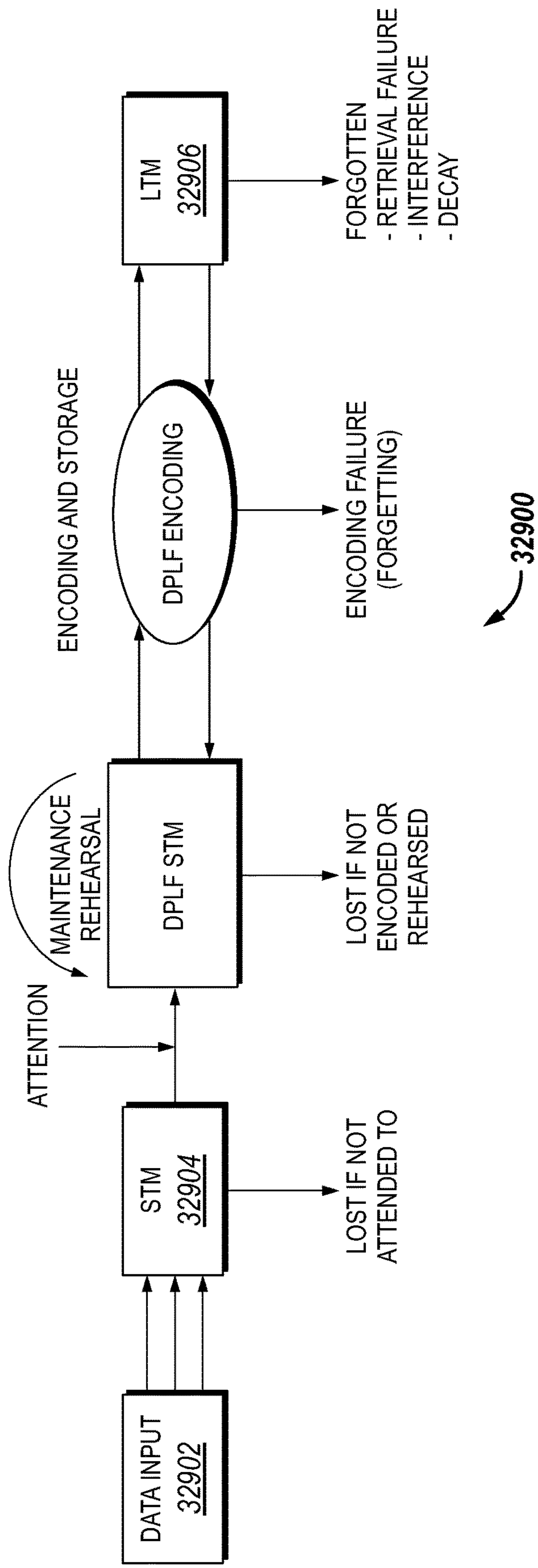

FIG. 329 is a diagrammatic view of a dual process artificial neural network system in accordance with some embodiments.

Figure 330:
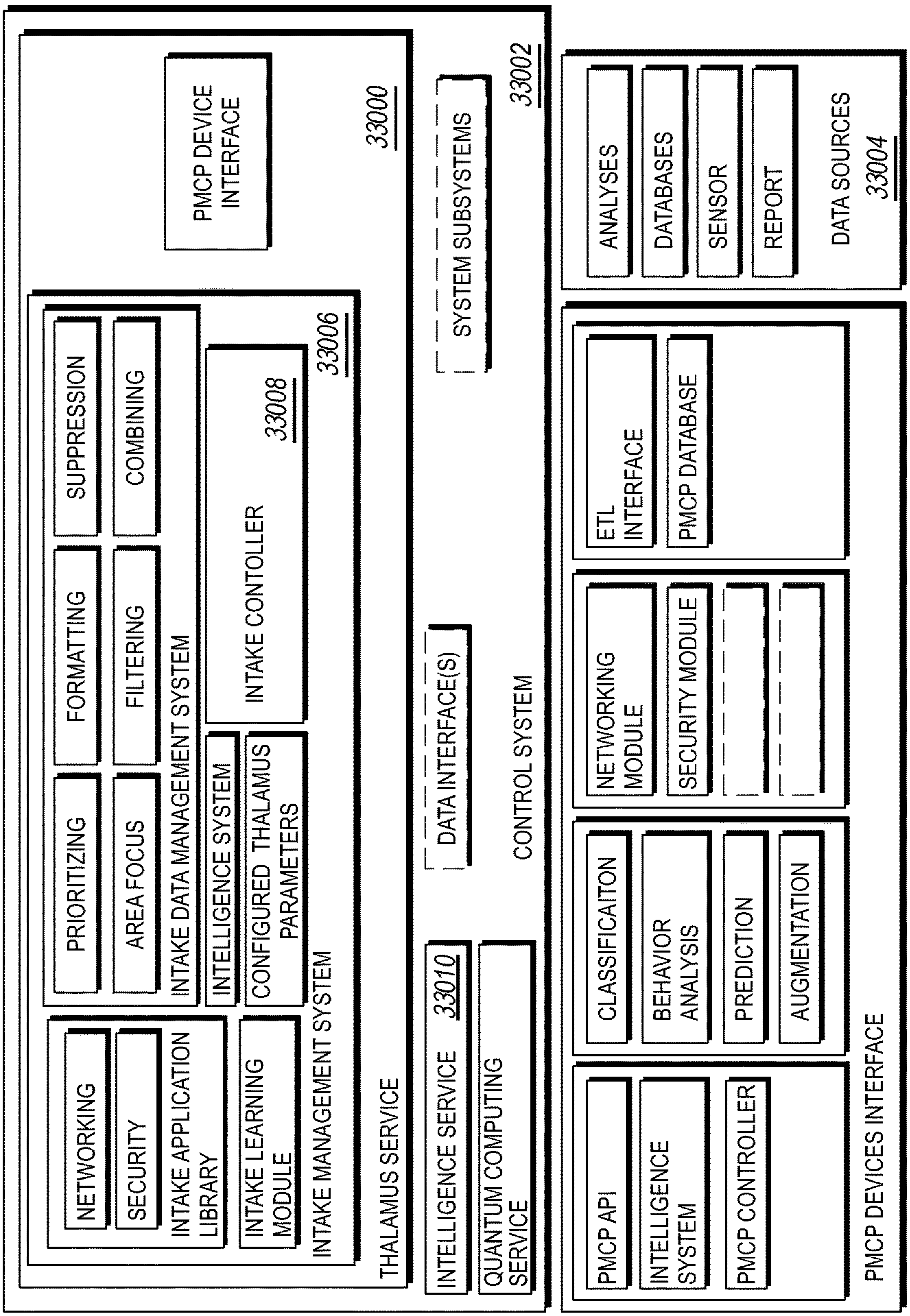

FIG. 330 is a diagrammatic view that illustrates embodiments of the biology-based system in accordance with the present disclosure.

Figure 331:
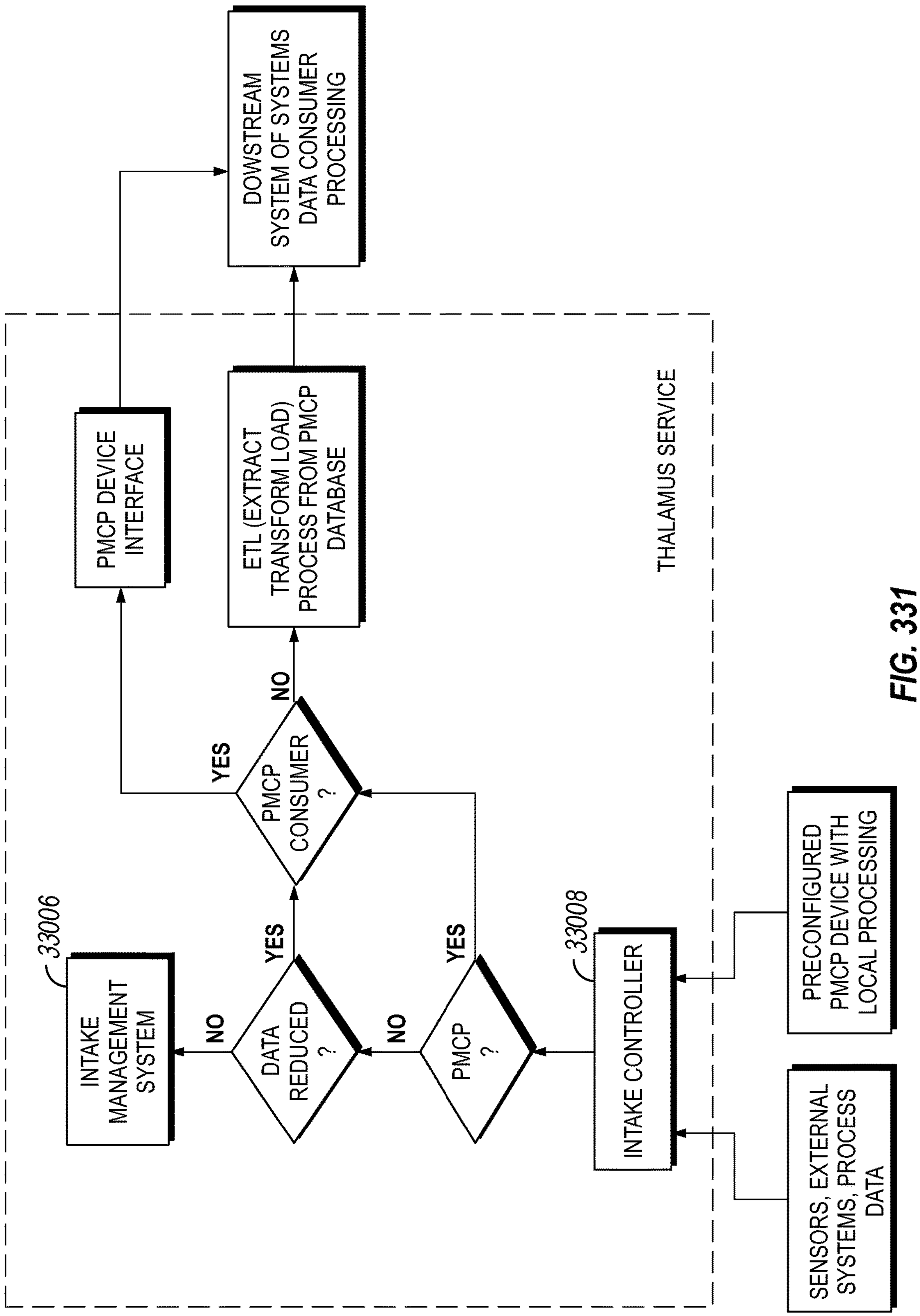

FIG. 331 is a diagrammatic view of a thalamus service in accordance with the present disclosure.

DETAILED DESCRIPTION

The term services/microservices (and similar terms) as utilized herein should be understood broadly. Without limitation to any other aspect or description of the present disclosure, a service/microservice includes any system (or platform) configured to functionally perform the operations of the service, where the system may be data-integrated, including data collection circuits, blockchain circuits, artificial intelligence circuits, and/or smart contract circuits for handling lending entities and transactions. Services/microservices may facilitate data handling and may include facilities for data extraction, transformation and loading; data cleansing and deduplication facilities; data normalization facilities; data synchronization facilities; data security facilities; computational facilities (e.g., for performing pre-defined calculation operations on data streams and providing an output stream); compression and de-compression facilities; analytic facilities (such as providing automated production of data visualizations), data processing facilities, and/or data storage facilities (including storage retention, formatting, compression, migration, etc.), and others.

Services/microservices may include controllers, processors, network infrastructure, input/output devices, servers, client devices (e.g., laptops, desktops, terminals, mobile devices, and/or dedicated devices), sensors (e.g., IoT sensors associated with one or more entities, equipment, and/or collateral), actuators (e.g., automated locks, notification devices, lights, camera controls, etc.), virtualized versions of any one or more of the foregoing (e.g., outsourced computing resources such as a cloud storage, computing operations; virtual sensors; subscribed data to be gathered such as stock or commodity prices, recordal logs, etc.), and/or include components configured as computer readable instructions that, when performed by a processor, cause the processor to perform one or more functions of the service, etc. Services may be distributed across a number of devices, and/or functions of a service may be performed by one or more devices cooperating to perform the given function of the service.

Services/microservices may include application programming interfaces that facilitate connection among the components of the system performing the service (e.g., microservices) and between the system to entities (e.g., programs, websites, user devices, etc.) that are external to the system. Without limitation to any other aspect of the present disclosure, example microservices that may be present in certain embodiments include (a) a multi-modal set of data collection circuits that collect information about and monitor entities related to a lending transaction; (b) blockchain circuits for maintaining a secure historical ledger of events related to a loan, the blockchain circuits having access control features that govern access by a set of parties involved in a loan; (c) a set of application programming interfaces, data integration services, data processing workflows and user interfaces for handling loan-related events and loan-related activities; and (d) smart contract circuits for specifying terms and conditions of smart contracts that govern at least one of loan terms and conditions, loan-related events, and loan-related activities. Any of the services/microservices may be controlled by or have control over a controller. Certain systems may not be considered to be a service/microservice. For example, a point of sale device that simply charges a set cost for a good or service may not be a service. In another example, a service that tracks the cost of a good or service and triggers notifications when the value changes may not be a valuation service itself, but may rely on valuation services, and/or may form a portion of a valuation service in certain embodiments. It can be seen that a given circuit, controller, or device may be a service or a part of a service in certain embodiments, such as when the functions or capabilities of the circuit, controller, or device are configured to support a service or microservice as described herein, but may not be a service or part of a service for other embodiments (e.g., where the functions or capabilities of the circuit, controller, or device are not relevant to a service or microservice as described herein). In another example, a mobile device being operated by a user may form a portion of a service as described herein at a first point in time (e.g., when the user accesses a feature of the service through an application or other communication from the mobile device, and/or when a monitoring function is being performed via the mobile device), but may not form a portion of the service at a second point in time (e.g., after a transaction is completed, after the user un-installs an application, and/or when a monitoring function is stopped and/or passed to another device). Accordingly, the benefits of the present disclosure may be applied in a wide variety of processes or systems, and any such processes or systems may be considered a service (or a part of a service) herein.

One of skill in the art, having the benefit of the disclosure herein and knowledge about a contemplated system ordinarily available to that person, can readily determine which aspects of the present disclosure will benefit a particular system, how to combine processes and systems from the present disclosure to construct, provide performance characteristics (e.g., bandwidth, computing power, time response, etc.), and/or provide operational capabilities (e.g., time between checks, up-time requirements including longitudinal (e.g., continuous operating time) and/or sequential (e.g., time-of-day, calendar time, etc.), resolution and/or accuracy of sensing, data determinations (e.g., accuracy, timing, amount of data), and/or actuator confirmation capability) of components of the service that are sufficient to provide a given embodiment of a service, platform, and/or microservice as described herein. Certain considerations for the person of skill in the art, in determining the configuration of components, circuits, controllers, and/or devices to implement a service, platform, and/or microservice ("service" in the listing following) as described herein include, without limitation: the balance of capital costs versus operating costs in implementing and operating the service; the availability, speed, and/or bandwidth of network services available for system components, service users, and/or other entities that interact with the service; the response time of considerations for the service (e.g., how quickly decisions within the service must be implemented to support the commercial function of the service, the operating time for various artificial intelligence or other high computation operations) and/or the capital or operating cost to support a given response time; the location of interacting components of the service, and the effects of such locations on operations of the service (e.g., data storage locations and relevant regulatory schemes, network communication limitations and/or costs, power costs as a function of the location, support availability for time zones relevant to the service, etc.); the availability of certain sensor types, the related support for those sensors, and the availability of sufficient substitutes (e.g., a camera may require supportive lighting, and/or high network bandwidth or local storage) for the sensing purpose; an aspect of the underlying value of an aspect of the service (e.g., a principal amount of a loan, a value of collateral, a volatility of the collateral value, a net worth or relative net worth of a lender, guarantor, and/or borrower, etc.) including the time sensitivity of the underlying value (e.g., if it changes quickly or slowly relative to the operations of the service or the term of the loan); a trust indicator between parties of a transaction (e.g., history of performance between the parties, a credit rating, social rating, or other external indicator, conformance of activity related to the transaction to an industry standard or other normalized transaction type, etc.); and/or the availability of cost recovery options (e.g., subscriptions, fees, payment for services, etc.) for given configurations and/or capabilities of the service, platform, and/or microservice. Without limitation to any other aspect of the present disclosure, certain operations performed by services herein include: performing real-time alterations to a loan based on tracked data; utilizing data to execute a collateral-backed smart contract; re-evaluating debt transactions in response to a tracked condition or data, and the like. While specific examples of services/microservices and considerations are described herein for purposes of illustration, any system benefitting from the disclosures herein, and any considerations understood to one of skill in the art having the benefit of the disclosures herein, are specifically contemplated within the scope of the present disclosure.

Without limitation, services include a financial service (e.g., a loan transaction service), a data collection service (e.g., a data collection service for collecting and monitoring data), a blockchain service (e.g., a blockchain service to maintain secure data), data integration services (e.g., a data integration service to aggregate data), smart contract services (e.g., a smart contract service to determine aspects of smart contracts), software services (e.g., a software service to extract data related to the entities from publicly available information sites), crowdsourcing services (e.g., a crowdsourcing service to solicit and report information), Internet of Things services (e.g., an Internet of Things service to monitor an environment), publishing services (e.g., a publishing services to publish data), microservices (e.g., having a set of application programming interfaces that facilitate connection among the microservices), valuation services (e.g., that use a valuation model to set a value for collateral based on information), artificial intelligence services, market value data collection services (e.g., that monitor and report on marketplace information), clustering services (e.g., for grouping the collateral items based on similarity of attributes), social networking services (e.g., that enables configuration with respect to parameters of a social network), asset identification services (e.g., for identifying a set of assets for which a financial institution is responsible for taking custody), identity management services (e.g., by which a financial institution verifies identities and credentials), and the like, and/or similar functional terminology. Example services to perform one or more functions herein include computing devices; servers; networked devices; user interfaces; inter-device interfaces such as communication protocols, shared information and/or information storage, and/or application programming interfaces (APIs); sensors (e.g., IoT sensors operationally coupled to monitored components, equipment, locations, or the like); distributed ledgers; circuits; and/or computer readable code configured to cause a processor to execute one or more functions of the service. One or more aspects or components of services herein may be distributed across a number of devices, and/or may consolidated, in whole or part, on a given device. In embodiments, aspects or components of services herein may be implemented at least in part through circuits, such as, in non-limiting examples, a data collection service implemented at least in part as a data collection circuit structured to collect and monitor data, a blockchain service implemented at least in part as a blockchain circuit structured to maintain secure data, data integration services implemented at least in part as a data integration circuit structured to aggregate data, smart contract services implemented at least in part as a smart contract circuit structured to determine aspects of smart contracts, software services implemented at least in part as a software service circuit structured to extract data related to the entities from publicly available information sites, crowdsourcing services implemented at least in part as a crowdsourcing circuit structured to solicit and report information, Internet of Things services implemented at least in part as an Internet of Things circuit structured to monitor an environment, publishing services implemented at least in part as a publishing services circuit structured to publish data, microservice service implemented at least in part as a microservice circuit structured to interconnect a plurality of service circuits, valuation service implemented at least in part as valuation services circuit structured to access a valuation model to set a value for collateral based on data, artificial intelligence service implemented at least in part as an artificial intelligence services circuit, market value data collection service implemented at least in part as market value data collection service circuit structured to monitor and report on marketplace information, clustering service implemented at least in part as a clustering services circuit structured to group collateral items based on similarity of attributes, a social networking service implemented at least in part as a social networking analytic services circuit structured to configure parameters with respect to a social network, asset identification services implemented at least in part as an asset identification service circuit for identifying a set of assets for which a financial institution is responsible for taking custody, identity management services implemented at least in part as an identity management service circuit enabling a financial institution to verify identities and credentials, and the like. Accordingly, the benefits of the present disclosure may be applied in a wide variety of systems, and any such systems may be considered with respect to items and services herein, while in certain embodiments a given system may not be considered with respect to items and services herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Among the considerations that one of skill in the art may contemplate to determine a configuration for a particular service include: the distribution and access devices available to one or more parties to a particular transaction; jurisdictional limitations on the storage, type, and communication of certain types of information; requirements or desired aspects of security and verification of information communication for the service; the response time of information gathering, inter-party communications, and determinations to be made by algorithms, machine learning components, and/or artificial intelligence components of the service; cost considerations of the service, including capital expenses and operating costs, as well as which party or entity will bear the costs and availability to recover costs such as through subscriptions, service fees, or the like; the amount of information to be stored and/or communicated to support the service; and/or the processing or computing power to be utilized to support the service.

The terms items and services (and similar terms) as utilized herein should be understood broadly. Without limitation to any other aspect or description of the present disclosure, items and service include any items and service, including, without limitation, items and services used as a reward, used as collateral, become the subject of a negotiation, and the like, such as, without limitation, an application for a warranty or guarantee with respect to an item that is the subject of a loan, collateral for a loan, or the like, such as a product, a service, an offering, a solution, a physical product, software, a level of service, quality of service, a financial instrument, a debt, an item of collateral, performance of a service, or other items. Without limitation to any other aspect or description of the present disclosure, items and service include any items and service, including, without limitation, items and services as applied to physical items (e.g., a vehicle, a ship, a plane, a building, a home, real estate property, undeveloped land, a farm, a crop, a municipal facility, a warehouse, a set of inventory, an antique, a fixture, an item of furniture, an item of equipment, a tool, an item of machinery, and an item of personal property), a financial item (e.g., a commodity, a security, a currency, a token of value, a ticket, a cryptocurrency), a consumable item (e.g., an edible item, a beverage), a highly valued item (e.g., a precious metal, an item of jewelry, a gemstone), an intellectual item (e.g., an item of intellectual property, an intellectual property right, a contractual right), and the like. Accordingly, the benefits of the present disclosure may be applied in a wide variety of systems, and any such systems may be considered with respect to items and services herein, while in certain embodiments a given system may not be considered with respect to items and services herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system.

The terms agent, automated agent, and similar terms as utilized herein should be understood broadly. Without limitation to any other aspect or description of the present disclosure, an agent or automated agent may process events relevant to at least one of the value, the condition, and the ownership of items of collateral or assets. The agent or automated agent may also undertake an action related to a loan, debt transaction, bond transaction, subsidized loan, or the like to which the collateral or asset is subject, such as in response to the processed events. The agent or automated agent may interact with a marketplace for purposes of collecting data, testing spot market transactions, executing transactions, and the like, where dynamic system behavior involves complex interactions that a user may desire to understand, predict, control, and/or optimize. Certain systems may not be considered an agent or an automated agent. For example, if events are merely collected but not processed, the system may not be an agent or automated agent. In some embodiments, if a loan-related action is undertaken not in response to a processed event, it may not have been undertaken by an agent or automated agent. One of skill in the art, having the benefit of the disclosure herein and knowledge about a contemplated system ordinarily available to that person, can readily determine which aspects of the present disclosure include and/or benefit from agents or automated agent. Certain considerations for the person of skill in the art, or embodiments of the present disclosure with respect to an agent or automated agent include, without limitation: rules that determine when there is a change in a value, condition or ownership of an asset or collateral, and/or rules to determine if a change warrants a further action on a loan or other transaction, and other considerations. While specific examples of market values and marketplace information are described herein for purposes of illustration, any embodiment benefitting from the disclosures herein, and any considerations understood to one of skill in the art having the benefit of the disclosures herein are specifically contemplated within the scope of the present disclosure.

The term marketplace information, market value and similar terms as utilized herein should be understood broadly. Without limitation to any other aspect or description of the present disclosure, marketplace information and market value describe a status or value of an asset, collateral, food, or service at a defined point or period in time. Market value may refer to the expected value placed on an item in a marketplace or auction setting, or pricing or financial data for items that are similar to the item, asset, or collateral in at least one public marketplace. For a company, market value may be the number of its outstanding shares multiplied by the current share price. Valuation services may include market value data collection services that monitor and report on marketplace information relevant to the value (e.g., market value) of collateral, the issuer, a set of bonds, and a set of assets. a set of subsidized loans, a party, and the like. Market values may be dynamic in nature because they depend on an assortment of factors, from physical operating conditions to economic climate to the dynamics of demand and supply. Market value may be affected by, and marketplace information may include, proximity to other assets, inventory or supply of assets, demand for assets, origin of items, history of items, underlying current value of item components, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity. In certain embodiments, a market value may include information such as a volatility of a value, a sensitivity of a value (e.g., relative to other parameters having an uncertainty associated therewith), and/or a specific value of the valuated object to a particular party (e.g., an object may have more value as possessed by a first party than as possessed by a second party).

Certain information may not be marketplace information or a market value. For example, where variables related to a value are not market-derived, they may be a value-in-use or an investment value. In certain embodiments, an investment value may be considered a market value (e.g., when the valuating party intends to utilize the asset as an investment if acquired), and not a market value in other embodiments (e.g., when the valuating party intends to immediately liquidate the investment if acquired). One of skill in the art, having the benefit of the disclosure herein and knowledge about a contemplated system ordinarily available to that person, can readily determine which aspects of the present disclosure will benefit from marketplace information or a market value. Certain considerations for the person of skill in the art, in determining whether the term market value is referring to an asset, item, collateral, good, or service include: the presence of other similar assets in a marketplace, the change in value depending on location, an opening bid of an item exceeding a list price, and other considerations. While specific examples of market values and marketplace information are described herein for purposes of illustration, any embodiment benefitting from the disclosures herein, and any considerations understood to one of skill in the art having the benefit of the disclosures herein are specifically contemplated within the scope of the present disclosure.

The term apportion value or apportioned value and similar terms as utilized herein should be understood broadly. Without limitation to any other aspect or description of the present disclosure, apportion value describes a proportional distribution or allocation of value proportionally, or a process to divide and assign value according to a rule of proportional distribution. Apportionment of the value may be to several parties (e.g., each of the several parties is a beneficiary of a portion of the value), to several transactions (e.g., each of the transactions utilizes a portion of the value), and/or in a many-to-many relationship (e.g., a group of objects has an aggregate value that is apportioned between a number of parties and/or transactions). In some embodiments, the value may be a net loss and the apportioned value is the allocation of a liability to each entity. In other embodiments, apportioned value may refer to the distribution or allocation of an economic benefit, real estate, collateral, or the like. In certain embodiments, apportionment may include a consideration of the value relative to the parties, for example, a $10 million asset apportioned 50/50 between two parties, where the parties have distinct value considerations for the asset, may result in one party crediting the apportionment differing resulting values from the apportionment. In certain embodiments, apportionment may include a consideration of the value relative to given transactions, for example, a first type of transaction (e.g., a long-term loan) may have a different valuation of a given asset than a second type of transaction (e.g., a short-term line of credit).

Certain conditions or processes may not relate to apportioned value. For example, the total value of an item may provide its inherent worth, but not how much of the value is held by each identified entity. One of skill in the art, having the benefit of the disclosure herein and knowledge about apportioned value, can readily determine which aspects of the present disclosure will benefit a particular application for apportioned value. Certain considerations for the person of skill in the art, or embodiments of the present disclosure with respect to an apportioned value include, without limitation: the currency of the principal sum, the anticipated transaction type (loan, bond or debt), the specific type of collateral, the ratio of the loan to value, the ratio of the collateral to the loan, the gross transaction/loan amount, the amount of the principal sum, the number of entities owed, the value of the collateral, and the like. While specific examples of apportioned values are described herein for purposes of illustration, any embodiment benefitting from the disclosures herein, and any considerations understood to one of skill in the art having the benefit of the disclosures herein are specifically contemplated within the scope of the present disclosure.

The term financial condition and similar terms as utilized herein should be understood broadly. Without limitation to any other aspect or description of the present disclosure, financial condition describes a current status of an entity's assets, liabilities, and equity positions at a defined point or period in time. The financial condition may be memorialized in financial statement. The financial condition may further include an assessment of the ability of the entity to survive future risk scenarios or meet future or maturing obligations. Financial condition may be based on a set of attributes of the entity selected from among a publicly stated valuation of the entity, a set of property owned by the entity as indicated by public records, a valuation of a set of property owned by the entity, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity. A financial condition may also describe a requirement or threshold for an agreement or loan. For example, conditions for allowing a developer to proceed may be various certifications and their agreement to a financial payout. That is, the developer's ability to proceed is conditioned upon a financial element, among others. Certain conditions may not be a financial condition. For example, a credit card balance alone may be a clue as to the financial condition, but may not be the financial condition on its own. In another example, a payment schedule may determine how long a debt may be on an entity's balance sheet, but in a silo may not accurately provide a financial condition. One of skill in the art, having the benefit of the disclosure herein and knowledge about a contemplated system ordinarily available to that person, can readily determine which aspects of the present disclosure include and/or will benefit from a financial condition. Certain considerations for the person of skill in the art, in determining whether the term financial condition is referring to a current status of an entity's assets, liabilities, and equity positions at a defined point or period in time and/or for a given purpose include: the reporting of more than one financial data point, the ratio of a loan to value of collateral, the ratio of the collateral to the loan, the gross transaction/loan amount, the credit scores of the borrower and the lender, and other considerations. While specific examples of financial conditions are described herein for purposes of illustration, any embodiment benefitting from the disclosures herein, and any considerations understood to one of skill in the art having the benefit of the disclosures herein are specifically contemplated within the scope of the present disclosure.

The term interest rate and similar terms, as utilized herein should be understood broadly. Without limitation to any other aspect or description of the present disclosure, interest rate includes an amount of interest due per period, as a proportion of an amount lent, deposited, or borrowed. The total interest on an amount lent or borrowed may depend on the principal sum, the interest rate, the compounding frequency, and the length of time over which it is lent, deposited, or borrowed. Typically, interest rate is expressed as an annual percentage but can be defined for any time period. The interest rate relates to the amount a bank or other lender charges to borrow its money, or the rate a bank or other entity pays its savers for keeping money in an account. Interest rate may be variable or fixed. For example, an interest rate may vary in accordance with a government or other stakeholder directive, the currency of the principal sum lent or borrowed, the term to maturity of the investment, the perceived default probability of the borrower, supply and demand in the market, the amount of collateral, the status of an economy, or special features like call provisions. In certain embodiments, an interest rate may be a relative rate (e.g., relative to a prime rate, an inflation index, etc.). In certain embodiments, an interest rate may further consider costs or fees applied (e.g., "points") to adjust the interest rate. A nominal interest rate may not be adjusted for inflation while a real interest rate takes inflation into account. Certain examples may not be an interest rate for purposes of particular embodiments. For example, a bank account growing by a fixed dollar amount each year, and/or a fixed fee amount, may not be an example of an interest rate for certain embodiments. One of skill in the art, having the benefit of the disclosure herein and knowledge about interest rates, can readily determine the characteristics of an interest rate for a particular embodiment. Certain considerations for the person of skill in the art, or embodiments of the present disclosure with respect to an interest rate include, without limitation: the currency of the principal sum, variables for setting an interest rate, criteria for modifying an interest rate, the anticipated transaction type (loan, bond or debt), the specific type of collateral, the ratio of the loan to value, the ratio of the collateral to the loan, the gross transaction/loan amount, the amount of the principal sum, the appropriate lifespans of transactions and/or collateral for a particular industry, the likelihood that a lender will sell and/or consolidate a loan before the term, and the like. While specific examples of interest rates are described herein for purposes of illustration, any embodiment benefitting from the disclosures herein, and any considerations understood to one of skill in the art having the benefit of the disclosures herein are specifically contemplated within the scope of the present disclosure.

The term valuation services (and similar terms) as utilized herein should be understood broadly. Without limitation to any other aspect or description of the present disclosure, a valuation service includes any service that sets a value for a good or service. Valuation services may use a valuation model to set a value for collateral based on information from data collection and monitoring services. Smart contract services may process output from the set of valuation services and assign items of collateral sufficient to provide security for a loan and/or apportion value for an item of collateral among a set of lenders and/or transactions. Valuation services may include artificial intelligence services that may iteratively improve the valuation model based on outcome data relating to transactions in collateral. Valuation services may include market value data collection services that may monitor and report on marketplace information relevant to the value of collateral. Certain processes may not be considered to be a valuation service. For example, a point of sale device that simply charges a set cost for a good or service may not be a valuation service. In another example, a service that tracks the cost of a good or service and triggers notifications when the value changes may not be a valuation service itself, but may rely on valuation services and/or form a part of a valuation service. Accordingly, the benefits of the present disclosure may be applied in a wide variety of processes systems, and any such processes or systems may be considered a valuation service herein, while in certain embodiments a given service may not be considered a valuation service herein. One of skill in the art, having the benefit of the disclosure herein and knowledge about a contemplated system ordinarily available to that person, can readily determine which aspects of the present disclosure will benefit a particular system and how to combine processes and systems from the present disclosure to enhance operations of the contemplated system and/or to provide a valuation service. Certain considerations for the person of skill in the art, in determining whether a contemplated system is a valuation service and/or whether aspects of the present disclosure can benefit or enhance the contemplated system include, without limitation: perform real-time alterations to a loan based on a value of a collateral; utilize marketplace data to execute a collateral-backed smart contract; re-evaluate collateral based on a storage condition or geolocation; the tendency of the collateral to have a volatile value, be utilized, and/or be moved; and the like. While specific examples of valuation services and considerations are described herein for purposes of illustration, any system benefitting from the disclosures herein, and any considerations understood to one of skill in the art having the benefit of the disclosures herein, are specifically contemplated within the scope of the present disclosure.

The term collateral attributes (and similar terms) as utilized herein should be understood broadly. Without limitation to any other aspect or description of the present disclosure, collateral attributes include any identification of the durability (ability of the collateral to withstand wear or the useful life of the collateral), value, identification (does the collateral have definite characteristics that make it easy to identify or market), stability of value (does the collateral maintain value over time), standardization, grade, quality, marketability, liquidity, transferability, desirability, trackability, deliverability (ability of the collateral be delivered or transfer without a deterioration in value), market transparency (is the collateral value easily verifiable or widely agreed upon), physical or virtual. Collateral attributes may be measured in absolute or relative terms, and/or may include qualitative (e.g., categorical descriptions) or quantitative descriptions. Collateral attributes may be different for different industries, products, elements, uses, and the like. Collateral attributes may be assigned quantitative or qualitative values. Values associated with collateral attributes may be based on a scale (such as 1-10) or a relative designation (high, low, better, etc.). Collateral may include various components; each component may have collateral attributes. Collateral may, therefore, have multiple values for the same collateral attribute. In some embodiments, multiple values of collateral attributes may be combined to generate one value for each attribute. Some collateral attributes may apply only to specific portions of collateral. Some collateral attributes, even for a given component of the collateral, may have distinct values depending upon the party of interest (e.g., a party that values an aspect of the collateral more highly than another party) and/or depending upon the type of transaction (e.g., the collateral may be more valuable or appropriate for a first type of loan than for a second type of loan). Certain attributes associated with collateral may not be collateral attributes as described herein depending upon the purpose of the collateral attributes herein. For example, a product may be rated as durable relative to similar products; however, if the life of the product is much lower than the term of a particular loan in consideration, the durability of the product may be rated differently (e.g., not durable) or irrelevant (e.g., where the current inventory of the product is attached as the collateral, and is expected to change out during the term of the loan). Accordingly, the benefits of the present disclosure may be applied to a variety of attributes, and any such attributes may be considered collateral attributes herein, while in certain embodiments a given attribute may not be considered a collateral attribute herein. One of skill in the art, having the benefit of the disclosure herein and knowledge about contemplated collateral attributes ordinarily available to that person, can readily determine which aspects of the present disclosure will benefit a particular collateral attribute. Certain considerations for the person of skill in the art, in determining whether a contemplated attribute is a collateral attribute and/or whether aspects of the present disclosure can benefit or enhance the contemplated system include, without limitation: the source of the attribute and the source of the value of the attribute (e.g. does the attribute and attribute value comes from a reputable source), the volatility of the attribute (e.g. does the attribute values for the collateral fluctuate, is the attribute a new attribute for the collateral), relative differences in attribute values for similar collateral, exceptional values for attributes (e.g., some attribute values may be high, such as, in the 98th percentile or very low, such as in the 2nd percentile, compared to similar class of collateral), the fungibility of the collateral, the type of transaction related to the collateral, and/or the purpose of the utilization of collateral for a particular party or transaction. While specific examples of collateral attributes and considerations are described herein for purposes of illustration, any system benefitting from the disclosures herein, and any considerations understood to one of skill in the art having the benefit of the disclosures herein, are specifically contemplated within the scope of the present disclosure.

The term blockchain services (and similar terms) as utilized herein should be understood broadly. Without limitation to any other aspect or description of the present disclosure, blockchain services include any service related to the processing, recordation, and/or updating of a blockchain, and may include services for processing blocks, computing hash values, generating new blocks in a blockchain, appending a block to the blockchain, creating a fork in the blockchain, merging of forks in the blockchain, verifying previous computations, updating a shared ledger, updating a distributed ledger, generating cryptographic keys, verifying transactions, maintaining a blockchain, updating a blockchain, verifying a blockchain, generating random numbers. The services may be performed by execution of computer readable instructions on local computers and/or by remote servers and computers. Certain services may not be considered blockchain services individually but may be considered blockchain services based on the final use of the service and/or in a particular embodiment, for example, a computing a hash value may be performed in a context outside of a blockchain such in the context of secure communication. Some initial services may be invoked without first being applied to blockchains, but further actions or services in conjunction with the initial services may associate the initial service with aspects of blockchains. For example, a random number may be periodically generated and stored in memory; the random numbers may initially not be generated for blockchain purposes but may be utilized for blockchains. Accordingly, the benefits of the present disclosure may be applied in a wide variety of services, and any such services may be considered blockchain services herein, while in certain embodiments a given service may not be considered a blockchain service herein. One of skill in the art, having the benefit of the disclosure herein and knowledge about a contemplated blockchain service ordinarily available to that person, can readily determine which aspects of the present disclosure can be configured to implement, and/or will benefit, a particular blockchain service. Certain considerations for the person of skill in the art, in determining whether a contemplated service is a blockchain service and/or whether aspects of the present disclosure can benefit or enhance the contemplated system include, without limitation: the application of the service, the source of the service (e.g., if the service is associated with a known or verifiable blockchain service provider), responsiveness of the service (e.g., some blockchain services may have an expected completion time, and/or may be determined through utilization), cost of the service, the amount of data requested for the service, and/or the amount of data generated by the service (blocks of blockchain or keys associated with blockchains may be a specific size or a specific range of sizes). While specific examples of blockchain services and considerations are described herein for purposes of illustration, any system benefitting from the disclosures herein, and any considerations understood to one of skill in the art having the benefit of the disclosures herein, are specifically contemplated within the scope of the present disclosure.

The term blockchain (and variations such as cryptocurrency ledger, and the like) as utilized herein may be understood broadly to describe a cryptocurrency ledger that records, administrates, or otherwise processes online transactions. A blockchain may be public, private, or a combination thereof, without limitation. A blockchain may also be used to represent a set of digital transactions, agreement, terms, or other digital value. Without limitation to any other aspect or description of the present disclosure, in the former case, a blockchain may also be used in conjunction with investment applications, token-trading applications, and/or digital/cryptocurrency based marketplaces. A blockchain can also be associated with rendering consideration, such as providing goods, services, items, fees, access to a restricted area or event, data, or other valuable benefit. Blockchains in various forms may be included where discussing a unit of consideration, collateral, currency, cryptocurrency, or any other form of value. One of skill in the art, having the benefit of the disclosure herein and knowledge ordinarily available about a contemplated system, can readily determine the value symbolized or represented by a blockchain. While specific examples of blockchains are described herein for purposes of illustration, any embodiment benefitting from the disclosures herein, and any considerations understood to one of skill in the art having the benefit of the disclosures herein, are specifically contemplated within the scope of the present disclosure.

The terms ledger and distributed ledger (and similar terms) as utilized herein should be understood broadly. Without limitation to any other aspect or description of the present disclosure, a ledger may be a document, file, computer file, database, book, and the like which maintains a record of transactions. Ledgers may be physical or digital. Ledgers may include records related to sales, accounts, purchases, transactions, assets, liabilities, incomes, expenses, capital, and the like. Ledgers may provide a history of transactions that may be associated with time. Ledgers may be centralized or decentralized/distributed. A centralized ledger may be a document that is controlled, updated, or viewable by one or more selected entities or a clearinghouse and wherein changes or updates to the ledger are governed or controlled by the entity or clearinghouse. A distributed ledger may be a ledger that is distributed across a plurality of entities, participants or regions which may independently, concurrently, or consensually, update, or modify their copies of the ledger. Ledgers and distributed ledgers may include security measures and cryptographic functions for signing, concealing, or verifying content. In the case of distributed ledgers, blockchain technology may be used. In the case of distributed ledgers implemented using blockchain, the ledger may be Merkle trees comprising a linked list of nodes in which each node contains hashed or encrypted transactional data of the previous nodes. Certain records of transactions may not be considered ledgers. A file, computer file, database, or book may or may not be a ledger depending on what data it stores, how the data is organized, maintained, or secured. For example, a list of transactions may not be considered a ledger if it cannot be trusted or verified, and/or if it is based on inconsistent, fraudulent, or incomplete data. Data in ledgers may be organized in any format such as tables, lists, binary streams of data, or the like which may depend on convenience, source of data, type of data, environment, applications, and the like. A ledger that is shared among various entities may not be a distributed ledger, but the distinction of distributed may be based on which entities are authorized to make changes to the ledger and/or how the changes are shared and processed among the different entities. Accordingly, the benefits of the present disclosure may be applied in a wide variety of data, and any such data may be considered ledgers herein, while in certain embodiments a given data may not be considered a ledger herein. One of skill in the art, having the benefit of the disclosure herein and knowledge about contemplated ledgers and distributed ledger ordinarily available to that person, can readily determine which aspects of the present disclosure can be utilized to implement, and/or will benefit a particular ledger. Certain considerations for the person of skill in the art, in determining whether a contemplated data is a ledger and/or whether aspects of the present disclosure can benefit or enhance the contemplated ledger include, without limitation: the security of the data in the ledger (can the data be tampered or modified), the time associated with making changes to the data in the ledger, cost of making changes (computationally and monetarily), detail of data, organization of data (does the data need to be processed for use in an application), who controls the ledger (can the party be trusted or relied to manage the ledger), confidentiality of the data (who can see or track the data in the ledger), size of the infrastructure, communication requirements (distributed ledgers may require a communication interface or specific infrastructure), resiliency. While specific examples of blockchain services and considerations are described herein for purposes of illustration, any system benefitting from the disclosures herein, and any considerations understood to one of skill in the art having the benefit of the disclosures herein, are specifically contemplated within the scope of the present disclosure.

The term loan (and similar terms) as utilized herein should be understood broadly. Without limitation to any other aspect or description of the present disclosure, a loan may be an agreement related to an asset that is borrowed, and that is expected to be returned in kind (e.g., money borrowed, and money returned) or as an agreed transaction (e.g., a first good or service is borrowed, and money, a second good or service, or a combination, is returned). Assets may be money, property, time, physical objects, virtual objects, services, a right (e.g., a ticket, a license, or other rights), a depreciation amount, a credit (e.g., a tax credit, an emissions credit, etc.), an agreed assumption of a risk or liability, and/or any combination thereof. A loan may be based on a formal or informal agreement between a borrower and a lender wherein a lender may provide an asset to the borrower for a predefined amount of time, a variable period of time, or indefinitely. Lenders and borrowers may be individuals, entities, corporations, governments, groups of people, organizations, and the like. Loan types may include mortgage loans, personal loans, secured loans, unsecured loans, concessional loans, commercial loans, microloans, and the like. The agreement between the borrower and the lender may specify terms of the loan. The borrower may be required to return an asset or repay with a different asset than was borrowed. In some cases, a loan may require interest to be repaid on the borrowed asset. Borrowers and lenders may be intermediaries between other entities and may never possess or use the asset. In some embodiments, a loan may not be associated with direct transfer of goods but may be associated with usage rights or shared usage rights. In certain embodiments, the agreement between the borrower and the lender may be executed between the borrower and the lender, and/or executed between an intermediary (e.g., a beneficiary of a loan right such as through a sale of the loan). In certain embodiment, the agreement between the borrower and the lender may be executed through services herein, such as through a smart contract service that determines at least a portion of the terms and conditions of the loans, and in certain embodiments may commit the borrower and/or the lender to the terms of the agreement, which may be a smart contract. In certain embodiments, the smart contract service may populate the terms of the agreement, and present them to the borrower and/or lender for execution. In certain embodiments, the smart contract service may automatically commit one of the borrower or the lender to the terms (at least as an offer) and may present the offer to the other one of the borrower or the lender for execution. In certain embodiments, a loan agreement may include multiple borrowers and/or multiple lenders, for example where a set of loans includes a number of beneficiaries of payment on the set of loans, and/or a number of borrowers on the set of loans. In certain embodiments, the risks and/or obligations of the set of loans may be individualized (e.g., each borrower and/or lender is related to specific loans of the set of loans), apportioned (e.g., a default on a particular loan has an associated loss apportioned between the lenders), and/or combinations of these (e.g., one or more subsets of the set of loans is treated individually and/or apportioned).

Certain agreements may not be considered a loan. An agreement to transfer or borrow assets may not be a loan depending on what assets are transferred, how the assets were transferred, or the parties involved. For example, in some cases, the transfer of assets may be for an indefinite time and may be considered a sale of the asset or a permanent transfer. Likewise, if an asset is borrowed or transferred without clear or definite terms or lack of consensus between the lender and the borrower it may, in some cases, not be considered a loan. An agreement may be considered a loan even if a formal agreement is not directly codified in a written agreement as long as the parties willingly and knowingly agreed to the arrangement, and/or ordinary practices (e.g., in a particular industry) may treat the transaction as a loan. Accordingly, the benefits of the present disclosure may be applied in a wide variety of agreements, and any such agreement may be considered a loan herein, while in certain embodiments a given agreement may not be considered a loan herein. One of skill in the art, having the benefit of the disclosure herein and knowledge about contemplated loans ordinarily available to that person, can readily determine which aspects of the present disclosure implement a loan, utilize a loan, or benefit a particular loan transaction. Certain considerations for the person of skill in the art, in determining whether a contemplated data is a loan and/or whether aspects of the present disclosure can benefit or enhance the contemplated loan include, without limitation: the value of the assets involved, the ability of the borrower to return or repay the loan, the types of assets involved (e.g., whether the asset is consumed through utilization), the repayment time frame associated with the loan, the interest on the loan, how the agreement of the loan was arranged, formality of the agreement, detail of the agreement, the detail of the agreements of the loan, the collateral attributes associated with the loan, and/or the ordinary business expectations of any of the foregoing in a particular context. While specific examples of loans and considerations are described herein for purposes of illustration, any system benefitting from the disclosures herein, and any considerations understood to one of skill in the art having the benefit of the disclosures herein, are specifically contemplated within the scope of the present disclosure.

The term loan related event(s) (and similar terms, including loan-related events) as utilized herein should be understood broadly. Without limitation to any other aspect or description of the present disclosure, a loan related events may include any event related to terms of the loan or events triggered by the agreement associated with the loan. Loan-related events may include default on loan, breach of contract, fulfillment, repayment, payment, change in interest, late fee assessment, refund assessment, distribution, and the like. Loan-related events may be triggered by explicit agreement terms; for example, an agreement may specify a rise in interest rate after a time period has elapsed from the beginning of the loan; the rise in interest rate triggered by the agreement may be a loan related event. Loan-related events may be triggered implicitly by related loan agreement terms. In certain embodiments, any occurrence that may be considered relevant to assumptions of the loan agreement, and/or expectations of the parties to the loan agreement, may be considered an occurrence of an event. For example, if collateral for a loan is expected to be replaceable (e.g., an inventory as collateral), then a change in inventory levels may be considered an occurrence of a loan related event. In another example, if review and/or confirmation of the collateral is expected, then a lack of access to the collateral, the disablement or failure of a monitoring sensor, etc. may be considered an occurrence of a loan related event. In certain embodiments, circuits, controllers, or other devices described herein may automatically trigger the determination of a loan-related events. In some embodiments, loan-related events may be triggered by entities that manage loans or loan-related contracts. Loan-related events may be conditionally triggered based on one or more conditions in the loan agreement. Loan related events may be related to tasks or requirements that need to be completed by the lender, borrower, or a third party. Certain events may be considered loan-related events in certain embodiments and/or in certain contexts, but may not be considered a loan-related event in another embodiment or context. Many events may be associated with loans but may be caused by external triggers not associated with a loan. However, in certain embodiments, an externally triggered event (e.g., a commodity price change related to a collateral item) may be loan-related events. For example, renegotiation of loan terms initiated by a lender may not be considered a loan related event if the terms and/or performance of the existing loan agreement did not trigger the renegotiation. Accordingly, the benefits of the present disclosure may be applied in a wide variety of events, and any such event may be considered a loan related event herein, while in certain embodiments given events may not be considered a loan related event herein. One of skill in the art, having the benefit of the disclosure herein and knowledge about a contemplated system ordinarily available to that person, can readily determine which aspects of the present disclosure may be considered a loan-related event for the contemplated system and/or for particular transactions supported by the system. Certain considerations for the person of skill in the art, in determining whether a contemplated data is a loan related event and/or whether aspects of the present disclosure can benefit or enhance the contemplated transaction system include, without limitation: the impact of the related event on the loan (events that cause default or termination of the loan may have higher impact), the cost (capital and/or operating) associated with the event, the cost (capital and/or operating) associated with monitoring for an occurrence of the event, the entities responsible for responding to the event, a time period and/or response time associated with the event (e.g., time required to complete the event and time that is allotted from the time the event is triggered to when processing or detection of the event is desired to occur), the entity responsible for the event, the data required for processing the event (e.g., confidential information may have different safeguards or restrictions), the availability of mitigating actions if an undetected event occurs, and/or the remedies available to an at-risk party if the event occurs without detection. While specific examples of loan-related events and considerations are described herein for purposes of illustration, any system benefitting from the disclosures herein, and any considerations understood to one of skill in the art having the benefit of the disclosures herein, are specifically contemplated within the scope of the present disclosure.

The term loan-related activities (and similar terms) as utilized herein should be understood broadly. Without limitation to any other aspect or description of the present disclosure, a loan related activity may include activities related to the generation, maintenance, termination, collection, enforcement, servicing, billing, marketing, ability to perform, or negotiation of a loan. Loan-related activity may include activities related to the signing of a loan agreement or a promissory note, review of loan documents, processing of payments, evaluation of collateral, evaluation of compliance of the borrower or lender to the loan terms, renegotiation of terms, perfection of security or collateral for the loan, and/or a negation of terms. Loan-related activities may relate to events associated with a loan before formal agreement on the terms, such as activities associated with initial negotiations. Loan-related activities may relate to events during the life of the loan and after the termination of a loan. Loan-related activities may be performed by a lender, borrower, or a third party. Certain activities may not be considered loan related activities services individually but may be considered loan related activities based on the specificity of the activity to the loan lifecycle—for example, billing or invoicing related to outstanding loans may be considered a loan related activity, however when the invoicing or billing of loans is combined with billing or invoicing for non loan-related elements the invoicing may not be considered a loan related activity. Some activities may be performed in relation to an asset regardless of whether a loan is associated with the asset; in these cases, the activity may not be considered a loan related activity. For example, regular audits related to an asset may occur regardless of whether the asset is associated with a loan and may not be considered a loan related activity. In another example, a regular audit related to an asset may be required by a loan agreement and would not typically occur but for the association with a loan, in this case, the activity may be considered a loan related activity. In some embodiments, activities may be considered loan-related activities if the activity would otherwise not occur if the loan is not active or present, but may still be considered a loan-related activity in some instances (e.g., if auditing occurs normally, but the lender does not have the ability to enforce or review the audit, then the audit may be considered a loan-related activity even though it already occurs otherwise). Accordingly, the benefits of the present disclosure may be applied in a wide variety of events, and any such event may be considered a loan related event herein, while in certain embodiments given events may not be considered a loan related events herein. One of skill in the art, having the benefit of the disclosure herein and knowledge about a contemplated system ordinarily available to that person, can readily determine a loan related activity for the purposes of the contemplated system. Certain considerations for the person of skill in the art, in determining whether a contemplated data is a loan related activity and/or whether aspects of the present disclosure can benefit or enhance the contemplated loan include, without limitation: the necessity of the activity for the loan (can the loan agreement or terms be satisfied without the activity), the cost of the activity, the specificity of the activity to the loan (is the activity similar or identical to other industries), time involved in the activity, the impact of the activity on a loan life cycle, entity performing the activity, amount of data required for the activity (does the activity require confidential information related to the loan, or personal information related to the entities), and/or the ability of parties to enforce and/or review the activity. While specific examples of loan-related events and considerations are described herein for purposes of illustration, any system benefitting from the disclosures herein, and any considerations understood to one of skill in the art having the benefit of the disclosures herein, are specifically contemplated within the scope of the present disclosure.

The terms loan-terms, loan terms, terms for a loan, terms and conditions, and the like as utilized herein should be understood broadly ("loan terms"). Without limitation to any other aspect or description of the present disclosure, loan terms may relate to conditions, rules, limitations, contract obligations, and the like related to the timing, repayment, origination, and other enforceable conditions agreed to by the borrower and the lender of the loan. Loan terms may be specified in a formal contract between a borrower and the lender. Loan terms may specify aspects of an interest rate, collateral, foreclose conditions, consequence of debt, payment options, payment schedule, a covenant, and the like. Loan terms may be negotiable or may change during the life of a loan. Loan terms may be change or be affected by outside parameters such as market prices, bond prices, conditions associated with a lender or borrower, and the like. Certain aspects of a loan may not be considered loan terms. In certain embodiments, aspects of loan that have not been formally agreed upon between a lender and a borrower, and/or that are not ordinarily understood in the course of business (and/or the particular industry) may not be considered loan terms. Certain aspects of a loan may be preliminary or informal until they have been formally agreed or confirmed in a contract or a formal agreement. Certain aspects of a loan may not be considered loan terms individually but may not be considered loan terms based on the specificity of the aspect to a specific loan. Certain aspects of a loan may not be considered loan terms at a particular time during the loan, but may be considered loan terms at another time during the loan (e.g., obligations and/or waivers that may occur through the performance of the parties, and/or expiration of a loan term). For example, an interest rate may generally not be considered a loan term until it is defined in relation of a loan and defined as to how the interest compounded (annual, monthly), calculated, and the like. An aspect of a loan may not be considered a term if it is indefinite or unenforceable. Some aspects may be manifestations or related to terms of a loan but may themselves not be the terms. For example, a loan term may be the repayment period of a loan, such as one year. The term may not specify how the loan is to be repaid in the year. The loan may be repaid with 12 monthly payments or one annual payment. A monthly payment plan in this case may not be considered a loan term as it can be just one or many options for repayment not directly specified by a loan. Accordingly, the benefits of the present disclosure may be applied in a wide variety of loan aspects, and any such aspect may be considered a loan term herein, while in certain embodiments given aspects may not be considered loan terms herein. One of skill in the art, having the benefit of the disclosure herein and knowledge about a contemplated system ordinarily available to that person, can readily determine which aspects of the present disclosure are loan terms for the contemplated system.

Certain considerations for the person of skill in the art, in determining whether a contemplated data is a loan term and/or whether aspects of the present disclosure can benefit or enhance the contemplated loan include, without limitation: the enforceability of the terms (can the conditions be enforced by the lender or the lender or the borrower), the cost of enforcing the terms (amount of time, or effort required ensure the conditions are being followed), the complexity of the terms (how easily can they be followed or understood by the parties involved, are the terms error prone or easily misunderstood), entities responsible for the terms, fairness of the terms, stability of the terms (how often do they change), observability of the terms (can the terms be verified by a another party), favorability of the terms to one party (do the terms favor the borrower or the lender), risk associated with the loan (terms may depend on the probability that the loan may not be repaid), characteristics of the borrower or lender (their ability to meet the terms), and/or ordinary expectations for the loan and/or related industry.

While specific examples of loan terms are described herein for purposes of illustration, any system benefitting from the disclosures herein, and any considerations understood to one of skill in the art having the benefit of the disclosures herein, are specifically contemplated within the scope of the present disclosure.

The term loan conditions, loan-conditions, conditions for a loan, terms and conditions, and the like as utilized herein should be understood broadly ("loan conditions"). Without limitation to any other aspect or description of the present disclosure, loan conditions may relate to rules, limits, and/or obligations related to a loan. Loan conditions may relate to rules or necessary obligations for obtaining a loan, for maintaining a loan, for applying for a loan, for transferring a loan, and the like. Loan conditions may include principal amount of debt, a balance of debt, a fixed interest rate, a variable interest rate, a payment amount, a payment schedule, a balloon payment schedule, a specification of collateral, a specification of substitutability of collateral, treatment of collateral, access to collateral, a party, a guarantee, a guarantor, a security, a personal guarantee, a lien, a duration, a covenant, a foreclose condition, a default condition, conditions related to other debts of the borrower, and a consequence of default.

Certain aspects of a loan may not be considered loan conditions. Aspects of loan that have not been formally agreed upon between a lender and a borrower, and/or that are not ordinarily understood in the course of business (and/or the particular industry), may not be considered loan conditions. Certain aspects of a loan may be preliminary or informal until they have been formally agreed or confirmed in a contract or a formal agreement. Certain aspects of a loan may not be considered loan conditions individually but may be considered loan conditions based on the specificity of the aspect to a specific loan. Certain aspects of a loan may not be considered loan conditions at a particular time during the loan, but may be considered loan conditions at another time during the loan (e.g., obligations and/or waivers that may occur through the performance of the parties, and/or expiration of a loan condition). Accordingly, the benefits of the present disclosure may be applied in a wide variety of loan aspects, and any such aspect may be considered loan conditions herein, while in certain embodiments given aspects may not be considered loan conditions herein. One of skill in the art, having the benefit of the disclosure herein and knowledge about a contemplated system ordinarily available to that person, can readily determine which aspects of the present disclosure are loan conditions for the contemplated system. Certain considerations for the person of skill in the art, in determining whether a contemplated data is a loan condition and/or whether aspects of the present disclosure can benefit or enhance the contemplated loan include, without limitation: the enforceability of the condition (can the conditions be enforced by the lender or the lender or the borrower), the cost of enforcing the condition (amount of time, or effort required ensure the conditions are being followed), the complexity of the condition (how easily can they be followed or understood by the parties involved, are the conditions error prone or easily misunderstood), entities responsible for the conditions, fairness of the conditions, observability of the conditions (can the conditions be verified by a another party), favorability of the conditions to one party (do the conditions favor the borrower or the lender), risk associated with the loan (conditions may depend on the probability that the loan may not be repaid), and/or ordinary expectations for the loan and/or related industry.

While specific examples of loan conditions are described herein for purposes of illustration, any system benefitting from the disclosures herein, and any considerations understood to one of skill in the art having the benefit of the disclosures herein, are specifically contemplated within the scope of the present disclosure.

The term loan collateral, collateral, item of collateral, collateral item, and the like as utilized herein should be understood broadly. Without limitation to any other aspect or description of the present disclosure, a loan collateral may relate to any asset or property that a borrower promises to a lender as backup in exchange for a loan, and/or as security for the loan. Collateral may be any item of value that is accepted as an alternate form of repayment in case of default on a loan. Collateral may include any number of physical or virtual items such as a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. Collateral may include more than one item or types of items.

A collateral item may describe an asset, a property, a value, or other item defined as a security for a loan or a transaction. A set of collateral items may be defined, and within that set substitution, removal or addition of collateral items may be affected. For example, a collateral item may be, without limitation: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, or an item of personal property, or the like. If a set or plurality of collateral items is defined, substitution, removal or addition of collateral items may be affected, such as substituting, removing, or adding a collateral item to or from a set of collateral items. Without limitation to any other aspect or description of the present disclosure, a collateral item or set of collateral items may also be used in conjunction with other terms to an agreement or loan, such as a representation, a warranty, an indemnity, a covenant, a balance of debt, a fixed interest rate, a variable interest rate, a payment amount, a payment schedule, a balloon payment schedule, a specification of collateral, a specification of substitutability of collateral, a security, a personal guarantee, a lien, a duration, a foreclose condition, a default condition, and a consequence of default. In certain embodiments, a smart contract may calculate whether a borrower has satisfied conditions or covenants and in cases where the borrower has not satisfied such conditions or covenants, may enable automated action, or trigger another conditions or terms that may affect the status, ownership, or transfer of a collateral item, or initiate the substitution, removal, or addition of collateral items to a set of collateral for a loan. One of skill in the art, having the benefit of the disclosure herein and knowledge about collateral items, can readily determine the purposes and use of collateral items in various embodiments and contexts disclosed herein, including the substitution, removal, and addition thereof.

While specific examples of loan collateral are described herein for purposes of illustration, any system benefitting from the disclosures herein, and any considerations understood to one of skill in the art having the benefit of the disclosures herein, are specifically contemplated within the scope of the present disclosure.

The term smart contract services (and similar terms) as utilized herein should be understood broadly. Without limitation to any other aspect or description of the present disclosure, a smart contract service includes any service or application that manages a smart contract or a smart lending contract. For example, the smart contract service may specify terms and conditions of a smart contract, such as in a rules database, or process output from a set of valuation services and assign items of collateral sufficient to provide security for a loan. Smart contract services may automatically execute a set of rules or conditions that embody the smart contract, wherein the execution may be based on or take advantage of collected data. Smart contract services may automatically initiate a demand for payment of a loan, automatically initiate a foreclosure process, automatically initiate an action to claim substitute or backup collateral or transfer ownership of collateral, automatically initiate an inspection process, automatically change a payment, or interest rate term that is based on the collateral, and may also configure smart contracts to automatically undertake a loan-related action. Smart contracts may govern at least one of loan terms and conditions, loan-related events, and loan-related activities. Smart contracts may be agreements that are encoded as computer protocols and may facilitate, verify, or enforce the negotiation or performance of a smart contract. Smart contracts may or may not be one or more of partially or fully self-executing, or partially or fully self-enforcing.

Certain processes may not be considered to be smart-contract related individually, but may be considered smart-contract related in an aggregated system—for example automatically undertaking a loan-related action may not be smart contract-related in one instance, but in another instance, may be governed by terms of a smart contract. Accordingly, the benefits of the present disclosure may be applied in a wide variety of processes systems, and any such processes or systems may be considered a smart contract or smart contract service herein, while in certain embodiments a given service may not be considered a smart contract service herein.

One of skill in the art, having the benefit of the disclosure herein and knowledge about a contemplated system ordinarily available to that person, can readily determine which aspects of the present disclosure will benefit a particular system and how to combine processes and systems from the present disclosure to implement a smart contract service and/or enhance operations of the contemplated system. Certain considerations for the person of skill in the art, in determining whether a contemplated system includes a smart contract service or smart contract and/or whether aspects of the present disclosure can benefit or enhance the contemplated system include, without limitation: ability to transfer ownership of collateral automatically in response to an event; automated actions available upon a finding of covenant compliance (or lack of compliance); the amenity of the collateral to clustering, re-balancing, distribution, addition, substitution, and removal of items from collateral; the modification parameters of an aspect of a loan in response to an event (e.g., timing, complexity, suitability for the loan type, etc.); the complexity of terms and conditions of loans for the system, including benefits from rapid determination and/or predictions of changes to entities (e.g., in the collateral, a financial condition of a party, offset collateral, and/or in an industry related to a party) related to the loan; the suitability of automated generation of terms and conditions and/or execution of terms and conditions for the types of loans, parties, and/or industries contemplated for the system; and the like. While specific examples of smart contract services and considerations are described herein for purposes of illustration, any system benefitting from the disclosures herein, and any considerations understood to one of skill in the art having the benefit of the disclosures herein, are specifically contemplated within the scope of the present disclosure.

The term IoT system (and similar terms) as utilized herein should be understood broadly. Without limitation to any other aspect or description of the present disclosure, an IoT system includes any system of uniquely identified and interrelated computing devices, mechanical and digital machines, sensors, and objects that are able to transfer data over a network without intervention. Certain components may not be considered an IoT system individually, but may be considered an IoT system in an aggregated system, for example, a single networked.

The sensor, smart speaker, and/or medical device may be not an IoT system, but may be a part of a larger system and/or be accumulated with a number of other similar components to be considered an IoT system and/or a part of an IoT system. In certain embodiments, a system may be considered an IoT system for some purposes but not for other purposes—for example, a smart speaker may be considered part of an IoT system for certain operations, such as for providing surround sound, or the like, but not part of an IoT system for other operations such as directly streaming content from a single, locally networked source. Additionally, in certain embodiments, otherwise similar looking systems may be differentiated in determining whether such systems are IoT systems, and/or which type of IoT system. For example, one group of medical devices may not, at a given time, be sharing to an aggregated HER database, while another group of medical devices may be sharing data to an aggregate HER for the purposes of a clinical study, and accordingly one group of medical devices may be an IoT system, while the other is not. Accordingly, the benefits of the present disclosure may be applied in a wide variety of systems, and any such systems may be considered an IoT system herein, while in certain embodiments a given system may not be considered an IoT system herein. One of skill in the art, having the benefit of the disclosure herein and knowledge about a contemplated system ordinarily available to that person, can readily determine which aspects of the present disclosure will benefit a particular system, how to combine processes and systems from the present disclosure to enhance operations of the contemplated system, and which circuits, controllers, and/or devices include an IoT system for the contemplated system. Certain considerations for the person of skill in the art, in determining whether a contemplated system is an IoT system and/or whether aspects of the present disclosure can benefit or enhance the contemplated system include, without limitation: the transmission environment of the system (e.g., availability of low power, inter-device networking); the shared data storage of a group of devices; establishment of a geofence by a group of devices; service as blockchain nodes; the performance of asset, collateral, or entity monitoring; the relay of data between devices; ability to aggregate data from a plurality of sensors or monitoring devices, and the like. While specific examples of IoT systems and considerations are described herein for purposes of illustration, any system benefitting from the disclosures herein, and any considerations understood to one of skill in the art having the benefit of the disclosures herein, are specifically contemplated within the scope of the present disclosure.

The term data collection services (and similar terms) as utilized herein should be understood broadly. Without limitation to any other aspect or description of the present disclosure, a data collection service includes any service that collects data or information, including any circuit, controller, device, or application that may store, transmit, transfer, share, process, organize, compare, report on and/or aggregate data. The data collection service may include data collection devices (e.g., sensors) and/or may be in communication with data collection devices. The data collection service may monitor entities, such as to identify data or information for collection. The data collection service may be event-driven, run on a periodic basis, or retrieve data from an application at particular points in the application's execution. Certain processes may not be considered to be a data collection service individually, but may be considered a data collection service in an aggregated system—for example, a networked storage device may be a component of a data collection service in one instance, but in another instance, may have stand-alone functionality. Accordingly, the benefits of the present disclosure may be applied in a wide variety of processes systems, and any such processes or systems may be considered a data collection service herein, while in certain embodiments a given service may not be considered a data collection service herein. One of skill in the art, having the benefit of the disclosure herein and knowledge about a contemplated system ordinarily available to that person, can readily determine which aspects of the present disclosure will benefit a particular system and how to combine processes and systems from the present disclosure implement a data collection service and/or to enhance operations of the contemplated system. Certain considerations for the person of skill in the art, in determining whether a contemplated system is a data collection service and/or whether aspects of the present disclosure can benefit or enhance the contemplated system include, without limitation: ability to modify a business rule on the fly and alter a data collection protocol; perform real-time monitoring of events; connection of a device for data collection to a monitoring infrastructure, execution of computer readable instructions that cause a processor to log or track events; use of an automated inspection system; occurrence of sales at a networked point-of-sale; need for data from one or more distributed sensors or cameras; and the like. While specific examples of data collection services and considerations are described herein for purposes of illustration, any system benefitting from the disclosures herein, and any considerations understood to one of skill in the art having the benefit of the disclosures herein, are specifically contemplated within the scope of the present disclosure.

The term data integration services (and similar terms) as utilized herein should be understood broadly. Without limitation to any other aspect or description of the present disclosure, a data integration service includes any service that integrates data or information, including any device or application that may extract, transform, load, normalize, compress, decompress, encode, decode, and otherwise process data packets, signals, and other information. The data integration service may monitor entities, such as to identify data or information for integration. The data integration service may integrate data regardless of required frequency, communication protocol, or business rules needed for intricate integration patterns. Accordingly, the benefits of the present disclosure may be applied in a wide variety of processes systems, and any such processes or systems may be considered a data integration service herein, while in certain embodiments a given service may not be considered a data integration service herein. One of skill in the art, having the benefit of the disclosure herein and knowledge about a contemplated system ordinarily available to that person, can readily determine which aspects of the present disclosure will benefit a particular system and how to combine processes and systems from the present disclosure to implement a data integration service and/or enhance operations of the contemplated system. Certain considerations for the person of skill in the art, in determining whether a contemplated system is a data integration service and/or whether aspects of the present disclosure can benefit or enhance the contemplated system include, without limitation: ability to modify a business rule on the fly and alter a data integration protocol; communication with third party databases to pull in data to integrate with; synchronization of data across disparate platforms; connection to a central data warehouse; data storage capacity, processing capacity, and/or communication capacity distributed throughout the system; the connection of separate, automated workflows; and the like. While specific examples of data integration services and considerations are described herein for purposes of illustration, any system benefitting from the disclosures herein, and any considerations understood to one of skill in the art having the benefit of the disclosures herein, are specifically contemplated within the scope of the present disclosure.

The term computational services (and similar terms) as utilized herein should be understood broadly. Without limitation to any other aspect or description of the present disclosure, computational services may be included as a part of one or more services, platforms, or microservices, such as blockchain services, data collection services, data integration services, valuation services, smart contract services, data monitoring services, data mining, and/or any service that facilitates collection, access, processing, transformation, analysis, storage, visualization, or sharing of data. Certain processes may not be considered to be a computational service. For example, a process may not be considered a computational service depending on the sorts of rules governing the service, an end product of the service, or the intent of the service. Accordingly, the benefits of the present disclosure may be applied in a wide variety of processes systems, and any such processes or systems may be considered a computational service herein, while in certain embodiments a given service may not be considered a computational service herein. One of skill in the art, having the benefit of the disclosure herein and knowledge about a contemplated system ordinarily available to that person, can readily determine which aspects of the present disclosure will benefit a particular system and how to combine processes and systems from the present disclosure to implement one or more computational service, and/or to enhance operations of the contemplated system. Certain considerations for the person of skill in the art, in determining whether a contemplated system is a computational service and/or whether aspects of the present disclosure can benefit or enhance the contemplated system include, without limitation: agreement-based access to the service; mediate an exchange between different services; provides on demand computational power to a web service; accomplishes one or more of monitoring, collection, access, processing, transformation, analysis, storage, integration, visualization, mining, or sharing of data. While specific examples of computational services and considerations are described herein for purposes of illustration, any system benefitting from the disclosures herein, and any considerations understood to one of skill in the art having the benefit of the disclosures herein, are specifically contemplated within the scope of the present disclosure.

The term sensor as utilized herein should be understood broadly. Without limitation to any other aspect or description of the present disclosure, a sensor may be a device, module, machine, or subsystem that detects or measures a physical quality, event, or change. In embodiments, may record, indicate, transmit, or otherwise respond to the detection or measurement. Examples of sensors may be sensors for sensing movement of entities, for sensing temperatures, pressures or other attributes about entities or their environments, cameras that capture still or video images of entities, sensors that collect data about collateral or assets, such as, for example, regarding the location, condition (health, physical, or otherwise), quality, security, possession, or the like. In embodiments, sensors may be sensitive to, but not influential on, the property to be measured but insensitive to other properties. Sensors may be analog or digital. Sensors may include processors, transmitters, transceivers, memory, power, sensing circuit, electrochemical fluid reservoirs, light sources, and the like. Further examples of sensors contemplated for use in the system include biosensors, chemical sensors, black silicon sensor, IR sensor, acoustic sensor, induction sensor, motion sensor, optical sensor, opacity sensor, proximity sensor, inductive sensor, Eddy-current sensor, passive infrared proximity sensor, radar, capacitance sensor, capacitive displacement sensor, hall-effect sensor, magnetic sensor, GPS sensor, thermal imaging sensor, thermocouple, thermistor, photoelectric sensor, ultrasonic sensor, infrared laser sensor, inertial motion sensor, MEMS internal motion sensor, ultrasonic 3D motion sensor, accelerometer, inclinometer, force sensor, piezoelectric sensor, rotary encoders, linear encoders, ozone sensor, smoke sensor, heat sensor, magnetometer, carbon dioxide detector, carbon monoxide detector, oxygen sensor, glucose sensor, smoke detector, metal detector, rain sensor, altimeter, GPS, detection of being outside, detection of context, detection of activity, object detector (e.g. collateral), marker detector (e.g. geo-location marker), laser rangefinder, sonar, capacitance, optical response, heart rate sensor, or an RF/micropower impulse radio (MIR) sensor. In certain embodiments, a sensor may be a virtual sensor—for example determining a parameter of interest as a calculation based on other sensed parameters in the system. In certain embodiments, a sensor may be a smart sensor—for example reporting a sensed value as an abstracted communication (e.g., as a network communication) of the sensed value. In certain embodiments, a sensor may provide a sensed value directly (e.g., as a voltage level, frequency parameter, etc.) to a circuit, controller, or other device in the system. One of skill in the art, having the benefit of the disclosure herein and knowledge about a contemplated system ordinarily available to that person, can readily determine which aspects of the present disclosure will benefit from a sensor. Certain considerations for the person of skill in the art, in determining whether a contemplated device is a sensor and/or whether aspects of the present disclosure can benefit from or be enhanced by the contemplated sensor include, without limitation: the conditioning of an activation/deactivation of a system to an environmental quality; the conversion of electrical output into measured quantities; the ability to enforce a geofence; the automatic modification of a loan in response to change in collateral; and the like. While specific examples of sensors and considerations are described herein for purposes of illustration, any system benefitting from the disclosures herein, and any considerations understood to one of skill in the art having the benefit of the disclosures herein, are specifically contemplated within the scope of the present disclosure.

The term storage condition and similar terms, as utilized herein should be understood broadly. Without limitation to any other aspect or description of the present disclosure, storage condition includes an environment, physical location, environmental quality, level of exposure, security measures, maintenance description, accessibility description, and the like related to the storage of an asset, collateral, or an entity specified and monitored in a contract, loan, or agreement or backing the contract, loan or other agreement, and the like. Based on a storage condition of a collateral, an asset, or entity, actions may be taken to, maintain, improve, and/or confirm a condition of the asset or the use of that asset as collateral. Based on a storage condition, actions may be taken to alter the terms or conditions of a loan or bond. Storage condition may be classified in accordance with various rules, thresholds, conditional procedures, workflows, model parameters, and the like and may be based on self-reporting or on data from Internet of Things devices, data from a set of environmental condition sensors, data from a set of social network analytic services and a set of algorithms for querying network domains, social media data, crowdsourced data, and the like. The storage condition may be tied to a geographic location relating to the collateral, the issuer, the borrower, the distribution of the funds or other geographic locations. Examples of IoT data may include images, sensor data, location data, and the like. Examples of social media data or crowdsourced data may include behavior of parties to the loan, financial condition of parties, adherence to a party's a term or condition of the loan, or bond, or the like. Parties to the loan may include issuers of a bond, related entities, lender, borrower, 3rd parties with an interest in the debt. Storage condition may relate to an asset or type of collateral such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. The storage condition may include an environment where environment may include an environment selected from among a municipal environment, a corporate environment, a securities trading environment, a real property environment, a commercial facility, a warehousing facility, a transportation environment, a manufacturing environment, a storage environment, a home, and a vehicle. Actions based on the storage condition of a collateral, an asset or an entity may include managing, reporting on, altering, syndicating, consolidating, terminating, maintaining, modifying terms and/or conditions, foreclosing an asset, or otherwise handling a loan, contract, or agreement. One of skill in the art, having the benefit of the disclosure herein and knowledge about a contemplated storage condition, can readily determine which aspects of the present disclosure will benefit a particular application for a storage condition. Certain considerations for the person of skill in the art, or embodiments of the present disclosure in choosing an appropriate storage condition to manage and/or monitor, include, without limitation: the legality of the condition given the jurisdiction of the transaction, the data available for a given collateral, the anticipated transaction type (loan, bond or debt), the specific type of collateral, the ratio of the loan to value, the ratio of the collateral to the loan, the gross transaction/loan amount, the credit scores of the borrower and the lender, ordinary practices in the industry, and other considerations. While specific examples of storage conditions are described herein for purposes of illustration, any embodiment benefitting from the disclosures herein, and any considerations understood to one of skill in the art having the benefit of the disclosures herein are specifically contemplated within the scope of the present disclosure.

The term geolocation and similar terms, as utilized herein should be understood broadly. Without limitation to any other aspect or description of the present disclosure, geolocation includes the identification or estimation of the real-world geographic location of an object, including the generation of a set of geographic coordinates (e.g. latitude and longitude) and/or street address. Based on a geolocation of a collateral, an asset, or entity, actions may be taken to maintain or improve a condition of the asset or the use of that asset as collateral. Based on a geolocation, actions may be taken to alter the terms or conditions of a loan or bond. Based on a geolocation, determinations or predictions related to a transaction may be performed—for example based upon the weather, civil unrest in a particular area, and/or local disasters (e.g., an earthquake, flood, tornado, hurricane, industrial accident, etc.). Geolocations may be determined in accordance with various rules, thresholds, conditional procedures, workflows, model parameters, and the like and may be based on self-reporting or on data from Internet of Things devices, data from a set of environmental condition sensors, data from a set of social network analytic services and a set of algorithms for querying network domains, social media data, crowdsourced data, and the like. Examples of geolocation data may include GPS coordinates, images, sensor data, street address, and the like. Geolocation data may be quantitative (e.g., longitude/latitude, relative to a plat map, etc.) and/or qualitative (e.g., categorical such as "coastal", "rural", etc.; "within New York City", etc.). Geolocation data may be absolute (e.g., GPS location) or relative (e.g., within 100 yards of an expected location). Examples of social media data or crowdsourced data may include behavior of parties to the loan as inferred by their geolocation, financial condition of parties inferred by geolocation, adherence of parties to a term or condition of the loan, or bond, or the like. Geolocation may be determined for an asset or type of collateral such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a consumable item, an edible item, a beverage, a precious metal, an item of jewelry, a gemstone, an antique, a fixture, an item of furniture, an item of equipment, a tool, an item of machinery, and an item of personal property. Geolocation may be determined for an entity such as one of the parties, a third-party (e.g., an inspection service, maintenance service, cleaning service, etc. relevant to a transaction), or any other entity related to a transaction. The geolocation may include an environment selected from among a municipal environment, a corporate environment, a securities trading environment, a real property environment, a commercial facility, a warehousing facility, a transportation environment, a manufacturing environment, a storage environment, a home, and a vehicle. Actions based on the geolocation of a collateral, an asset or an entity may include managing, reporting on, altering, syndicating, consolidating, terminating, maintaining, modifying terms and/or conditions, foreclosing an asset, or otherwise handling a loan, contract, or agreement. One of skill in the art, having the benefit of the disclosure herein and knowledge about a contemplated system, can readily determine which aspects of the present disclosure will benefit a particular application for a geolocation, and which location aspect of an item is a geolocation for the contemplated system. Certain considerations for the person of skill in the art, or embodiments of the present disclosure in choosing an appropriate geolocation to manage, include, without limitation: the legality of the geolocation given the jurisdiction of the transaction, the data available for a given collateral, the anticipated transaction type (loan, bond or debt), the specific type of collateral, the ratio of the loan to value, the ratio of the collateral to the loan, the gross transaction/loan amount, the frequency of travel of the borrower to certain jurisdictions and other considerations, the mobility of the collateral, and/or a likelihood of location-specific event occurrence relevant to the transaction (e.g., weather, location of a relevant industrial facility, availability of relevant services, etc.). While specific examples of geolocation are described herein for purposes of illustration, any embodiment benefitting from the disclosures herein, and any considerations understood to one of skill in the art having the benefit of the disclosures herein are specifically contemplated within the scope of the present disclosure.

The term jurisdictional location and similar terms, as utilized herein should be understood broadly. Without limitation to any other aspect or description of the present disclosure, jurisdictional location refers to the laws and legal authority governing a loan entity. The jurisdictional location may be based on a geolocation of an entity, a registration location of an entity (e.g. a ship's flag state, a state of incorporation for a business, and the like), a granting state for certain rights such as intellectual priority, and the like. In certain embodiments, a jurisdictional location may be one or more of the geolocations for an entity in the system. In certain embodiments, a jurisdictional location may not be the same as the geolocation of any entity in the system (e.g., where an agreement specifies some other jurisdiction). In certain embodiments, a jurisdictional location may vary for entities in the system (e.g., borrower at A, lender at B, collateral positioned at C, agreement enforced at D, etc.). In certain embodiments, a jurisdictional location for a given entity may vary during the operations of the system (e.g., due to movement of collateral, related data, changes in terms and conditions, etc.). In certain embodiments, a given entity of the system may have more than one jurisdictional location (e.g., due to operations of the relevant law, and/or options available to one or more parties), and/or may have distinct jurisdictional locations for different purposes. A jurisdictional location of an item of collateral, an asset, or entity, actions may dictate certain terms or conditions of a loan or bond, and/or may indicate different obligations for notices to parties, foreclosure and/or default execution, treatment of collateral and/or debt security, and/or treatment of various data within the system. While specific examples of jurisdictional location are described herein for purposes of illustration, any embodiment benefitting from the disclosures herein, and any considerations understood to one of skill in the art having the benefit of the disclosures herein are specifically contemplated within the scope of the present disclosure.

The terms token of value, token, and variations such as cryptocurrency token, and the like, as utilized herein, in the context of increments of value, may be understood broadly to describe either: (a) a unit of currency or cryptocurrency (e.g. a cryptocurrency token), and (b) may also be used to represent a credential that can be exchanged for a good, service, data or other valuable consideration (e.g. a token of value). Without limitation to any other aspect or description of the present disclosure, in the former case, a token may also be used in conjunction with investment applications, token-trading applications, and token-based marketplaces. In the latter case, a token can also be associated with rendering consideration, such as providing goods, services, fees, access to a restricted area or event, data, or other valuable benefit. Tokens can be contingent (e.g. contingent access token) or not contingent. For example, a token of value may be exchanged for accommodations, (e.g. hotel rooms), dining/food goods and services, space (e.g. shared space, workspace, convention space, etc.), fitness/wellness goods or services, event tickets or event admissions, travel, flights or other transportation, digital content, virtual goods, license keys, or other valuable goods, services, data, or consideration. Tokens in various forms may be included where discussing a unit of consideration, collateral, or value, whether currency, cryptocurrency, or any other form of value such as goods, services, data, or other benefits. One of skill in the art, having the benefit of the disclosure herein and knowledge about a token, can readily determine the value symbolized or represented by a token, whether currency, cryptocurrency, good, service, data, or other value. While specific examples of tokens are described herein for purposes of illustration, any embodiment benefitting from the disclosures herein, and any considerations understood to one of skill in the art having the benefit of the disclosures herein, are specifically contemplated within the scope of the present disclosure.

The term pricing data as utilized herein may be understood broadly to describe a quantity of information such as a price or cost, of one or more items in a marketplace. Without limitation to any other aspect or description of the present disclosure, pricing data may also be used in conjunction with spot market pricing, forward market pricing, pricing discount information, promotional pricing, and other information relating to the cost or price of items. Pricing data may satisfy one or more conditions, or may trigger application of one or more rules of a smart contract. Pricing data may be used in conjunction with other forms of data such as market value data, accounting data, access data, asset and facility data, worker data, event data, underwriting data, claims data or other forms of data. Pricing data may be adjusted for the context of the valued item (e.g., condition, liquidity, location, etc.) and/or for the context of a particular party. One of skill in the art, having the benefit of the disclosure herein and knowledge about pricing data, can readily determine the purposes and use of pricing data in various embodiments and contexts disclosed herein.

Without limitation to any other aspect or description of the present disclosure, a token includes any token including, without limitation, a token of value, such as collateral, an asset, a reward, such as in a token serving as representation of value, such as a value holding voucher that can be exchanged for goods or services. Certain components may not be considered tokens individually, but may be considered tokens in an aggregated system, for example, a value placed on an asset may not be in itself be a token, but the value of an asset may be placed in a token of value, such as to be stored, exchanged, traded, and the like. For instance, in a non-limiting example, a blockchain circuit may be structured to provide lenders a mechanism to store the value of assets, where the value attributed to the token is stored in a distributed ledger of the blockchain circuit, but the token itself, assigned the value, may be exchanged, or traded such as through a token marketplace. In certain embodiments, a token may be considered a token for some purposes but not for other purposes—for example, a token may be used as an indication of ownership of an asset, but this use of a token would not be traded as a value where a token including the value of the asset might. Accordingly, the benefits of the present disclosure may be applied in a wide variety of systems, and any such systems may be considered a token herein, while in certain embodiments a given system may not be considered a token herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a token and/or whether aspects of the present disclosure can benefit or enhance the contemplated system include, without limitation, access data such as relating to rights of access, tickets, and tokens; use in an investment application such as for investment in shares, interests, and tokens; a token-trading application; a token-based marketplace; forms of consideration such as monetary rewards and tokens; translating the value of a resources in tokens; a cryptocurrency token; indications of ownership such as identity information, event information, and token information; a blockchain-based access token traded in a marketplace application; pricing application such as for setting and monitoring pricing for contingent access rights, underlying access rights, tokens, and fees; trading applications such as for trading or exchanging contingent access rights or underlying access rights or tokens; tokens created and stored on a blockchain for contingent access rights resulting in an ownership (e.g., a ticket); and the like.

The term financial data as utilized herein may be understood broadly to describe a collection of financial information about an asset, collateral or other item or items. Financial data may include revenues, expenses, assets, liabilities, equity, bond ratings, default, return on assets (ROA), return on investment (ROI), past performance, expected future performance, earnings per share (EPS), internal rate of return (IRR), earnings announcements, ratios, statistical analysis of any of the foregoing (e.g. moving averages), and the like. Without limitation to any other aspect or description of the present disclosure, financial data may also be used in conjunction with pricing data and market value data. Financial data may satisfy one or more conditions, or may trigger application of one or more rules of a smart contract. Financial data may be used in conjunction with other forms of data such as market value data, pricing data, accounting data, access data, asset and facility data, worker data, event data, underwriting data, claims data or other forms of data. One of skill in the art, having the benefit of the disclosure herein and knowledge about financial data, can readily determine the purposes and use of pricing data in various embodiments and contexts disclosed herein.

The term covenant as utilized herein may be understood broadly to describe a term, agreement, or promise, such as performance of some action or inaction. For example, a covenant may relate to behavior of a party or legal status of a party. Without limitation to any other aspect or description of the present disclosure, a covenant may also be used in conjunction with other related terms to an agreement or loan, such as a representation, a warranty, an indemnity, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a foreclose condition, a default condition, and a consequence of default. A covenant or lack of performance of a covenant may satisfy one or more conditions, or may trigger collection, breach or other terms and conditions. In certain embodiments, a smart contract may calculate whether a covenant is satisfied and in cases where the covenant is not satisfied, may enable automated action, or trigger other conditions or terms. One of skill in the art, having the benefit of the disclosure herein and knowledge about covenants, can readily determine the purposes and use of covenants in various embodiments and contexts disclosed herein.

The term entity as utilized herein may be understood broadly to describe a party, a third-party (e.g., an auditor, regulator, service provider, etc.), and/or an identifiable related object such as an item of collateral related to a transaction. Example entities include an individual, partnership, corporation, limited liability company or other legal organization. Other example entities include an identifiable item of collateral, offset collateral, potential collateral, or the like. For example, an entity may be a given party, such as an individual, to an agreement or loan. Data or other terms herein may be characterized as having a context relating to an entity, such as entity-oriented data. An entity may be characterized with a specific context or application, such as a human entity, physical entity, transactional entity, or a financial entity, without limitation. An entity may have representatives that represent or act on its behalf. Without limitation to any other aspect or description of the present disclosure, an entity may also be used in conjunction with other related entities or terms to an agreement or loan, such as a representation, a warranty, an indemnity, a covenant, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a foreclose condition, a default condition, and a consequence of default. An entity may have a set of attributes such as: a publicly stated valuation, a set of property owned by the entity as indicated by public records, a valuation of a set of property owned by the entity, a bankruptcy condition, a foreclosure status, a contractual default status, a regulatory violation status, a criminal status, an export controls status, an embargo status, a tariff status, a tax status, a credit report, a credit rating, a website rating, a set of customer reviews for a product of an entity, a social network rating, a set of credentials, a set of referrals, a set of testimonials, a set of behavior, a location, and a geolocation, without limitation. In certain embodiments, a smart contract may calculate whether an entity has satisfied conditions or covenants and in cases where the entity has not satisfied such conditions or covenants, may enable automated action, or trigger other conditions or terms. One of skill in the art, having the benefit of the disclosure herein and knowledge about entities, can readily determine the purposes and use of entities in various embodiments and contexts disclosed herein.

The term party as utilized herein may be understood broadly to describe a member of an agreement, such as an individual, partnership, corporation, limited liability company or other legal organization. For example, a party may be a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, an accountant or other entities having rights or obligations to an agreement, transaction or loan. A party may characterize a different term, such as transaction as in the term multi-party transaction, where multiple parties are involved in a transaction, or the like, without limitation. A party may have representatives that represent or act on its behalf. In certain embodiments, the term party may reference a potential party or a prospective party—for example, an intended lender or borrower interacting with a system, that may not yet be committed to an actual agreement during the interactions with the system. Without limitation to any other aspect or description of the present disclosure, an party may also be used in conjunction with other related parties or terms to an agreement or loan, such as a representation, a warranty, an indemnity, a covenant, a balance of debt, a fixed interest rate, a variable interest rate, a payment amount, a payment schedule, a balloon payment schedule, a specification of collateral, a specification of substitutability of collateral, an entity, a guarantee, a guarantor, a security, a personal guarantee, a lien, a duration, a foreclose condition, a default condition, and a consequence of default. A party may have a set of attributes such as: an identity, a creditworthiness, an activity, a behavior, a business practice, a status of performance of a contract, information about accounts receivable, information about accounts payable, information about the value of collateral, and other types of information, without limitation. In certain embodiments, a smart contract may calculate whether a party has satisfied conditions or covenants and in cases where the party has not satisfied such conditions or covenants, may enable automated action, or trigger other conditions or terms. One of skill in the art, having the benefit of the disclosure herein and knowledge about parties, can readily determine the purposes and use of parties in various embodiments and contexts disclosed herein.

The term party attribute, entity attribute, or party/entity attribute as utilized herein may be understood broadly to describe a value, characteristic, or status of a party or entity. For example, attributes of a party or entity may be, without limitation: value, quality, location, net worth, price, physical condition, health condition, security, safety, ownership, identity, creditworthiness, activity, behavior, business practice, status of performance of a contract, information about accounts receivable, information about accounts payable, information about the value of collateral, and other types of information, and the like. In certain embodiments, a smart contract may calculate values, status or conditions associated with attributes of a party or entity, and in cases where the party or entity has not satisfied such conditions or covenants, may enable automated action, or trigger other conditions or terms. One of skill in the art, having the benefit of the disclosure herein and knowledge about attributes of a party or entity, can readily determine the purposes and use of these attributes in various embodiments and contexts disclosed herein.

The term lender as utilized herein may be understood broadly to describe a party to an agreement offering an asset for lending, proceeds of a loan, and may include an individual, partnership, corporation, limited liability company, or other legal organization. For example, a lender may be a primary lender, a secondary lender, a lending syndicate, a corporate lender, a government lender, a bank lender, a secured lender, an unsecured lender, or other party having rights or obligations to an agreement, transaction or loan offering a loan to a borrower, without limitation. A lender may have representatives that represent or act on its behalf. Without limitation to any other aspect or description of the present disclosure, an party may also be used in conjunction with other related parties or terms to an agreement or loan, such as a borrower, a guarantor, a representation, a warranty, an indemnity, a covenant, a balance of debt, a fixed interest rate, a variable interest rate, a payment amount, a payment schedule, a balloon payment schedule, a specification of collateral, a specification of substitutability of collateral, a security, a personal guarantee, a lien, a duration, a foreclose condition, a default condition, and a consequence of default. In certain embodiments, a smart contract may calculate whether a lender has satisfied conditions or covenants and in cases where the lender has not satisfied such conditions or covenants, may enable automated action, a notification or alert, or trigger other conditions or terms. One of skill in the art, having the benefit of the disclosure herein and knowledge about a lender, can readily determine the purposes and use of a lender in various embodiments and contexts disclosed herein.

The term crowdsourcing services as utilized herein may be understood broadly to describe services offered or rendered in conjunction with a crowdsourcing model or transaction, wherein a large group of people or entities supply contributions to fulfill a need, such as a loan, for the transaction. Crowdsourcing services may be provided by a platform or system, without limitation. A crowdsourcing request may be communicated to a group of information suppliers and by which responses to the request may be collected and processed to provide a reward to at least one successful information supplier. The request and parameters may be configured to obtain information related to the condition of a set of collateral for a loan. The crowdsourcing request may be published. In certain embodiments, without limitation, crowdsourcing services may be performed by a smart contract, wherein the reward is managed by a smart contract that processes responses to the crowdsourcing request and automatically allocates a reward to information that satisfies a set of parameter configured for the crowdsourcing request. One of skill in the art, having the benefit of the disclosure herein and knowledge about crowdsourcing services, can readily determine the purposes and use of crowdsourcing services in various embodiments and contexts disclosed herein.

The term publishing services as utilized herein may be understood to describe a set of services to publish a crowdsourcing request. Publishing services may be provided by a platform or system, without limitation. In certain embodiments, without limitation, publishing services may be performed by a smart contract, wherein the crowdsourcing request is published, or publication is initiated by the smart contract. One of skill in the art, having the benefit of the disclosure herein and knowledge about publishing services, can readily determine the purposes and use of publishing services in various embodiments and contexts disclosed herein.

The term interface as utilized herein may be understood broadly to describe a component by which interaction or communication is achieved, such as a component of a computer, which may be embodied in software, hardware, or a combination thereof. For example, an interface may serve a number of different purposes or be configured for different applications or contexts, such as, without limitation: an application programming interface, a graphic user interface, user interface, software interface, marketplace interface, demand aggregation interface, crowdsourcing interface, secure access control interface, network interface, data integration interface or a cloud computing interface, or combinations thereof. An interface may serve to act as a way to enter, receive or display data, within the scope of lending, refinancing, collection, consolidation, factoring, brokering or foreclosure, without limitation. An interface may serve as an interface for another interface. Without limitation to any other aspect or description of the present disclosure, an interface may be used in conjunction with applications, processes, modules, services, layers, devices, components, machines, products, sub-systems, interfaces, connections, or as part of a system. In certain embodiments, an interface may be embodied in software, hardware, or a combination thereof, as well as stored on a medium or in memory. One of skill in the art, having the benefit of the disclosure herein and knowledge about an interface, can readily determine the purposes and use of an interface in various embodiments and contexts disclosed herein.

The term graphical user interface as utilized herein may be understood as a type of interface to allow a user to interact with a system, computer, or other interfaces, in which interaction or communication is achieved through graphical devices or representations. A graphical user interface may be a component of a computer, which may be embodied in computer readable instructions, hardware, or a combination thereof. A graphical user interface may serve a number of different purposes or be configured for different applications or contexts. Such an interface may serve to act as a way to receive or display data using visual representation, stimulus or interactive data, without limitation. A graphical user interface may serve as an interface for another graphical user interface or other interfaces. Without limitation to any other aspect or description of the present disclosure, a graphical user interface may be used in conjunction with applications, processes, modules, services, layers, devices, components, machines, products, sub-systems, interfaces, connections, or as part of a system. In certain embodiments, a graphical user interface may be embodied in computer readable instructions, hardware, or a combination thereof, as well as stored on a medium or in memory. Graphical user interfaces may be configured for any input types, including keyboards, a mouse, a touch screen, and the like. Graphical user interfaces may be configured for any desired user interaction environments, including for example a dedicated application, a web page interface, or combinations of these. One of skill in the art, having the benefit of the disclosure herein and knowledge about a graphical user interface, can readily determine the purposes and use of a graphical user interface in various embodiments and contexts disclosed herein.

The term user interface as utilized herein may be understood as a type of interface to allow a user to interact with a system, computer, or other apparatus, in which interaction or communication is achieved through graphical devices or representations. A user interface may be a component of a computer, which may be embodied in software, hardware, or a combination thereof. The user interface may be stored on a medium or in memory. User interfaces may include drop-down menus, tables, forms, or the like with default, templated, recommended, or pre-configured conditions. In certain embodiments, a user interface may include voice interaction. Without limitation to any other aspect or description of the present disclosure, a user interface may be used in conjunction with applications, circuits, controllers, processes, modules, services, layers, devices, components, machines, products, sub-systems, interfaces, connections, or as part of a system. User interfaces may serve a number of different purposes or be configured for different applications or contexts. For example, a lender-side user interface may include features to view a plurality of customer profiles, but may be restricted from making certain changes. A debtor-side user interface may include features to view details and make changes to a user account. A 3rd party neutral-side interface (e.g. a 3rd party not having an interest in an underlying transaction, such as a regulator, auditor, etc.) may have features that enable a view of company oversight and anonymized user data without the ability to manipulate any data, and may have scheduled access depending upon the 3rd party and the purpose for the access. A 3rd party interested-side interface (e.g. a 3rd party that may have an interest in an underlying transaction, such as a collector, debtor advocate, investigator, partial owner, etc.) may include features enabling a view of particular user data with restrictions on making changes. Many more features of these user interfaces may be available to implements embodiments of the systems and/or procedures described throughout the present disclosure. Accordingly, the benefits of the present disclosure may be applied in a wide variety of processes and systems, and any such processes or systems may be considered a service herein. One of skill in the art, having the benefit of the disclosure herein and knowledge about a user interface, can readily determine the purposes and use of a user interface in various embodiments and contexts disclosed herein. Certain considerations for the person of skill in the art, in determining whether a contemplated interface is a user interface and/or whether aspects of the present disclosure can benefit or enhance the contemplated system include, without limitation: configurable views, ability to restrict manipulation or views, report functions, ability to manipulate user profile and data, implement regulatory requirements, provide the desired user features for borrowers, lenders, and 3rd parties, and the like.

Interfaces and dashboards as utilized herein may further be understood broadly to describe a component by which interaction or communication is achieved, such as a component of a computer, which may be embodied in software, hardware, or a combination thereof. Interfaces and dashboards may acquire, receive, present, or otherwise administrate an item, service, offering or other aspects of a transaction or loan. For example, interfaces and dashboards may serve a number of different purposes or be configured for different applications or contexts, such as, without limitation: an application programming interface, a graphic user interface, user interface, software interface, marketplace interface, demand aggregation interface, crowdsourcing interface, secure access control interface, network interface, data integration interface or a cloud computing interface, or combinations thereof. An interface or dashboard may serve to act as a way to receive or display data, within the context of lending, refinancing, collection, consolidation, factoring, brokering or foreclosure, without limitation. An interface or dashboard may serve as an interface or dashboard for another interface or dashboard. Without limitation to any other aspect or description of the present disclosure, an interface may be used in conjunction with applications, circuits, controllers, processes, modules, services, layers, devices, components, machines, products, sub-systems, interfaces, connections, or as part of a system. In certain embodiments, an interface or dashboard may be embodied in computer readable instructions, hardware, or a combination thereof, as well as stored on a medium or in memory. One of skill in the art, having the benefit of the disclosure herein and knowledge ordinarily available about a contemplated system, can readily determine the purposes and use of interfaces and/or dashboards in various embodiments and contexts disclosed herein.

The term domain as utilized herein may be understood broadly to describe a scope or context of a transaction and/or communications related to a transaction. For example, a domain may serve a number of different purposes or be configured for different applications or contexts, such as, without limitation: a domain for execution, a domain for a digital asset, domains to which a request will be published, domains to which social network data collection and monitoring services will be applied, domains to which Internet of Things data collection and monitoring services will be applied, network domains, geolocation domains, jurisdictional location domains, and time domains. Without limitation to any other aspect or description of the present disclosure, one or more domains may be utilized relative to any applications, circuits, controllers, processes, modules, services, layers, devices, components, machines, products, sub-systems, interfaces, connections, or as part of a system. In certain embodiments, a domain may be embodied in computer readable instructions, hardware, or a combination thereof, as well as stored on a medium or in memory. One of skill in the art, having the benefit of the disclosure herein and knowledge about a domain, can readily determine the purposes and use of a domain in various embodiments and contexts disclosed herein.

The term request (and variations) as utilized herein may be understood broadly to describe the action or instance of initiating or asking for a thing (e.g. information, a response, an object, and the like) to be provided. A specific type of request may also serve a number of different purposes or be configured for different applications or contexts, such as, without limitation: a formal legal request (e.g. a subpoena), a request to refinance (e.g. a loan), or a crowdsourcing request. Systems may be utilized to perform requests as well as fulfill requests. Requests in various forms may be included where discussing a legal action, a refinancing of a loan, or a crowdsourcing service, without limitation. One of skill in the art, having the benefit of the disclosure herein and knowledge about a contemplated system, can readily determine the value of a request implemented in an embodiment. While specific examples of requests are described herein for purposes of illustration, any embodiment benefitting from the disclosures herein, and any considerations understood to one of skill in the art having the benefit of the disclosures herein, are specifically contemplated within the scope of the present disclosure.

The term reward (and variations) as utilized herein may be understood broadly to describe a thing or consideration received or provided in response to an action or stimulus. Rewards can be of a financial type, or non-financial type, without limitation. A specific type of reward may also serve a number of different purposes or be configured for different applications or contexts, such as, without limitation: a reward event, claims for rewards, monetary rewards, rewards captured as a data set, rewards points, and other forms of rewards. Rewards may be triggered, allocated, generated for innovation, provided for the submission of evidence, requested, offered, selected, administrated, managed, configured, allocated, conveyed, identified, without limitation, as well as other actions. Systems may be utilized to perform the aforementioned actions. Rewards in various forms may be included where discussing a particular behavior, or encouragement of a particular behavior, without limitation. In certain embodiments herein, a reward may be utilized as a specific incentive (e.g., rewarding a particular person that responds to a crowdsourcing request) or as a general incentive (e.g., providing a reward responsive to a successful crowdsourcing request, in addition to or alternatively to a reward to the particular person that responded). One of skill in the art, having the benefit of the disclosure herein and knowledge about a reward, can readily determine the value of a reward implemented in an embodiment. While specific examples of rewards are described herein for purposes of illustration, any embodiment benefitting from the disclosures herein, and any considerations understood to one of skill in the art having the benefit of the disclosures herein, are specifically contemplated within the scope of the present disclosure.

The term robotic process automation system as utilized herein may be understood broadly to describe a system capable of performing tasks or providing needs for a system of the present disclosure. For example, a robotic process automation system, without limitation, can be configured for: negotiation of a set of terms and conditions for a loan, negotiation of refinancing of a loan, loan collection, consolidating a set of loans, managing a factoring loan, brokering a mortgage loan, training for foreclosure negotiations, configuring a crowdsourcing request based on a set of attributes for a loan, setting a reward, determining a set of domains to which a request will be published, configuring the content of a request, configuring a data collection and monitoring action based on a set of attributes of a loan, determining a set of domains to which the Internet of Things data collection and monitoring services will be applied, and iteratively training and improving based on a set of outcomes. A robotic process automation system may include: a set of data collection and monitoring services, an artificial intelligence system, and another robotic process automation system which is a component of the higher level robotic process automation system. The robotic process automation system may include: at least one of the set of mortgage loan activities and the set of mortgage loan interactions includes activities among marketing activity, identification of a set of prospective borrowers, identification of property, identification of collateral, qualification of borrower, title search, title verification, property assessment, property inspection, property valuation, income verification, borrower demographic analysis, identification of capital providers, determination of available interest rates, determination of available payment terms and conditions, analysis of existing mortgage, comparative analysis of existing and new mortgage terms, completion of application workflow, population of fields of application, preparation of mortgage agreement, completion of schedule to mortgage agreement, negotiation of mortgage terms and conditions with capital provider, negotiation of mortgage terms and conditions with borrower, transfer of title, placement of lien and closing of mortgage agreement. Example and non-limiting robotic process automation systems may include one or more user interfaces, interfaces with circuits and/or controllers throughout the system to provide, request, and/or share data, and/or one or more artificial intelligence circuits configured to iteratively improve one or more operations of the robotic process automation system. One of skill in the art, having the benefit of the disclosure herein and knowledge ordinarily available about a contemplated robotic process automation system, can readily determine the circuits, controllers, and/or devices to include to implement a robotic process automation system performing the selected functions for the contemplated system. While specific examples of robotic process automation systems are described herein for purposes of illustration, any embodiment benefitting from the disclosures herein, and any considerations understood.

The term loan-related action (and other related terms such as loan-related event and loan-related activity) are utilized herein and may be understood broadly to describe one or multiple actions, events or activities relating to a transaction that includes a loan within the transaction. The action, event or activity may occur in many different contexts of loans, such as lending, refinancing, consolidation, factoring, brokering, foreclosure, administration, negotiating, collecting, procuring, enforcing and data processing (e.g. data collection), or combinations thereof, without limitation. A loan-related action may be used in the form of a noun (e.g. a notice of default has been communicated to the borrower with formal notice, which could be considered a loan-related action). A loan-related action, event, or activity may refer to a single instance, or may characterize a group of actions, events, or activities. For example, a single action such as providing a specific notice to a borrower of an overdue payment may be considered a loan-related action. Similarly, a group of actions from start to finish relating to a default may also be considered a single loan-related action. Appraisal, inspection, funding, and recording, without limitation, may all also be considered loan-related actions that have occurred, as well as events relating to the loan, and may also be loan-related events. Similarly, these activities of completing these actions may also be considered loan-related activities (e.g. appraising, inspecting, funding, recording, etc.), without limitation. In certain embodiments, a smart contract or robotic process automation system may perform loan-related actions, loan-related events, or loan-related activities for one or more of the parties, and process appropriate tasks for completion of the same. In some cases the smart contract or robotic process automation system may not complete a loan-related action, and depending upon such outcome this may enable an automated action or may trigger other conditions or terms. One of skill in the art, having the benefit of the disclosure herein and knowledge about loan-related actions, events, and activities can readily determine the purposes and use of this term in various forms and embodiments as described throughout the present disclosure.

The term loan-related action, events, and activities, as noted herein, may also more specifically be utilized to describe a context for calling of a loan. A calling of a loan is an action wherein the lender can demand the loan be repaid, usually triggered by some other condition or term, such as delinquent payment(s). For example, a loan-related action for calling of the loan may occur when a borrower misses three payments in a row, such that there is a severe delinquency in the loan payment schedule, and the loan goes into default. In such a scenario, a lender may be initiating loan-related actions for calling of the loan to protect its rights. In such a scenario, perhaps the borrower pays a sum to cure the delinquency and penalties, which may also be considered as a loan-related action for calling of the loan. In some circumstances, a smart contract or robotic process automation system may initiate, administrate, or process loan-related actions for calling of the loan, which without limitation, may including providing notice, researching, and collecting payment history, or other tasks performed as a part of the calling of the loan. One of skill in the art, having the benefit of the disclosure herein and knowledge about loan-related actions for calling of the loan, or other forms of the term and its various forms, can readily determine the purposes and use of this term in the context of an event or other various embodiments and contexts disclosed herein.

The term loan-related action, events, and activities, as noted herein, may also more specifically be utilized to describe a context for payment of a loan. Typically in transactions involving loans, without limitation, a loan is repaid on a payment schedule. Various actions may be taken to provide a borrower with information to pay back the loan, as well as actions for a lender to receive payment for the loan. For example, if a borrower makes a payment on the loan, a loan-related action for payment of the loan may occur. Without limitation, such a payment may comprise several actions that may occur with respect to the payment on the loan, such as: the payment being tendered to the lender, the loan ledger or accounting reflecting that a payment has been made, a receipt provided to the borrower of the payment made, and the next payment being requested of the borrower. In some circumstances, a smart contract or robotic process automation system may initiate, administrate, or process such loan-related actions for payment of the loan, which without limitation, may including providing notice to the lender, researching and collecting payment history, providing a receipt to the borrower, providing notice of the next payment due to the borrower, or other actions associated with payment of the loan. One of skill in the art, having the benefit of the disclosure herein and knowledge about loan-related actions for payment of a loan, or other forms of the term and its various forms, can readily determine the purposes and use of this term in the context of an event or other various embodiments and contexts disclosed herein.

The term loan-related action, events, and activities, as noted herein, may also more specifically be utilized to describe a context for a payment schedule or alternative payment schedule. Typically in transactions involving loans, without limitation, a loan is repaid on a payment schedule, which may be modified over time. Or, such a payment schedule may be developed and agreed in the alternative, with an alternative payment schedule. Various actions may be taken in the context of a payment schedule or alternate payment schedule for the lender or the borrower, such as: the amount of such payments, when such payments are due, what penalties or fees may attach to late payments, or other terms. For example, if a borrower makes an early payment on the loan, a loan-related action for payment schedule and alternative payment schedule of the loan may occur; in such case, perhaps the payment is applied as principal, with the regular payment still being due. Without limitation, loan-related actions for a payment schedule and alternative payment schedule may comprise several actions that may occur with respect to the payment on the loan, such as: the payment being tendered to the lender, the loan ledger or accounting reflecting that a payment has been made, a receipt provided to the borrower of the payment made, a calculation if any fees are attached or due, and the next payment being requested of the borrower. In certain embodiments, an activity to determine a payment schedule or alternative payment schedule may be a loan-related action, event, or activity. In certain embodiments, an activity to communicate the payment schedule or alternative payment schedule (e.g., to the borrower, the lender, or a 3rd party) may be a loan-related action, event, or activity. In some circumstances, a smart contract circuit or robotic process automation system may initiate, administrate, or process such loan-related actions for payment schedule and alternative payment schedule, which without limitation, may include providing notice to the lender, researching and collecting payment history, providing a receipt to the borrower, calculating the next due date, calculating the final payment amount and date, providing notice of the next payment due to the borrower, determining the payment schedule or an alternate payment schedule, communicating the payment scheduler or an alternate payment schedule, or other actions associated with payment of the loan. One of skill in the art, having the benefit of the disclosure herein and knowledge about loan-related actions for payment schedule and alternative payment schedule, or other forms of the term and its various forms, can readily determine the purposes and use of this term in the context of an event or other various embodiments and contexts disclosed herein.

The term regulatory notice requirement (and any derivatives) as utilized herein may be understood broadly to describe an obligation or condition to communicate a notification or message to another party or entity. The regulatory notice requirement may be required under one or more conditions that are triggered, or generally required. For example, a lender may have a regulatory notice requirement to provide notice to a borrower of a default of a loan, or change of an interest rate of a loan, or other notifications relating to a transaction or loan. The regulatory aspect of the term may be attributed to jurisdiction-specific laws, rules, or codes that require certain obligations of communication. In certain embodiments, a policy directive may be treated as a regulatory notice requirement, for example where a lender has an internal notice policy that may exceed the regulatory requirements of one or more of the jurisdictional locations related to a transaction. The notice aspect generally relates to formal communications, which may take many different forms, but may specifically be specified as a particular form of notice, such as a certified mail, facsimile, email transmission, or other physical or electronic form, a content for the notice, and/or a timing requirement related to the notice. The requirement aspect relates to the necessity of a party to complete its obligation to be in compliance with laws, rules, codes, policies, standard practices, or terms of an agreement or loan. In certain embodiments, a smart contract may process or trigger regulatory notice requirements and provide appropriate notice to a borrower. This may be based on location of at least one of: the lender, the borrower, the funds provided via the loan, the repayment of the loan, and the collateral of the loan, or other locations as designated by the terms of the loan, transaction, or agreement. In cases where a party or entity has not satisfied such regulatory notice requirements, certain changes in the rights or obligations between the parties may be triggered—for example where a lender provides a non-compliant notice to the borrower, an automated action or trigger based on the terms and conditions of the loan, and/or based on external information (e.g., a regulatory prescription, internal policy of the lender, etc.) may be affected by a smart contract circuit and/or robotic process automation system may be implemented. One of skill in the art, having the benefit of the disclosure herein and knowledge ordinarily available about a contemplated system, can readily determine the purposes and use of regulatory notice requirements in various embodiments and contexts disclosed herein.

The term regulatory notice requirement may also be utilized herein to describe an obligation or condition to communicate a notification or message to another party or entity based upon a general or specific policy, rather than based on a particular jurisdiction, or laws, rules, or codes of a particular location (as in regulatory notice requirement that may be jurisdiction-specific). The regulatory notice requirement may be prudent or suggested, rather than obligatory or required, under one or more conditions that are triggered, or generally required. For example, a lender may have a regulatory notice requirement that is policy based to provide notice to a borrower of a new informational website, or will experience a change of an interest rate of a loan in the future, or other notifications relating to a transaction or loan that are advisory or helpful, rather than mandatory (although mandatory notices may also fall under a policy basis). Thus, in policy based uses of the regulatory notice requirement term, a smart contract circuit may process or trigger regulatory notice requirements and provide appropriate notice to a borrower which may or may not necessarily be required by a law, rule, or code. The basis of the notice or communication may be out of prudence, courtesy, custom, or obligation.

The term regulatory notice may also be utilized herein to describe an obligation or condition to communicate a notification or message to another party or entity specifically, such as a lender or borrower. The regulatory notice may be specifically directed toward any party or entity, or a group of parties or entities. For example, a particular notice or communication may be advisable or required to be provided to a borrower, such as on circumstances of a borrower's failure to provide scheduled payments on a loan resulting in a default. As such, such a regulatory notice directed to a particular user, such as a lender or borrower, may be as a result of a regulatory notice requirement that is jurisdiction-specific or policy-based, or otherwise. Thus, in some circumstances a smart contract may process or trigger a regulatory notice and provide appropriate notice to a specific party such as a borrower, which may or may not necessarily be required by a law, rule, or code, but may otherwise be provided out of prudence, courtesy or custom. In cases where a party or entity has not satisfied such regulatory notice requirements to a specific party or parties, it may create circumstances where certain rights may be forgiven by one or more parties or entities, or may enable automated action or trigger other conditions or terms. One of skill in the art, having the benefit of the disclosure herein and knowledge ordinarily available about a contemplated system, can readily determine the purposes and use of regulatory notice requirements based in various embodiments and contexts disclosed herein.

The term regulatory foreclosure requirement (and any derivatives) as utilized herein may be understood broadly to describe an obligation or condition in order to trigger, process or complete default of a loan, foreclosure, or recapture of collateral, or other related foreclosure actions. The regulatory foreclosure requirement may be required under one or more conditions that are triggered, or generally required. For example, a lender may have a regulatory foreclosure requirement to provide notice to a borrower of a default of a loan, or other notifications relating to the default of a loan prior to foreclosure. The regulatory aspect of the term may be attributed to jurisdiction-specific laws, rules, or codes that require certain obligations of communication. The foreclosure aspect generally relates to the specific remedy of foreclosure, or a recapture of collateral property and default of a loan, which may take many different forms, but may be specified in the terms of the loan. The requirement aspect relates to the necessity of a party to complete its obligation in order to be in compliance or performance of laws, rules, codes or terms of an agreement or loan. In certain embodiments, a smart contract circuit may process or trigger regulatory foreclosure requirements and process appropriate tasks relating to such a foreclosure action. This may be based on a jurisdictional location of at least one of the lender, the borrower, the fund provided via the loan, the repayment of the loan, and the collateral of the loan, or other locations as designated by the terms of the loan, transaction, or agreement. In cases where a party or entity has not satisfied such regulatory foreclosure requirements, certain rights may be forgiven by the party or entity (e.g. a lender), or such a failure to comply with the regulatory notice requirement may enable automated action or trigger other conditions or terms. One of skill in the art, having the benefit of the disclosure herein and knowledge ordinarily available about a contemplated system, can readily determine the purposes and use of regulatory foreclosure requirements in various embodiments and contexts disclosed herein.

The term regulatory foreclosure requirement may also be utilized herein to describe an obligation or in order to trigger, process or complete default of a loan, foreclosure, or recapture of collateral, or other related foreclosure actions. based upon a general or specific policy rather than based on a particular jurisdiction, or laws, rules, or codes of a particular location (as in regulatory foreclosure requirement that may be jurisdiction-specific). The regulatory foreclosure requirement may be prudent or suggested, rather than obligatory or required, under one or more conditions that are triggered, or generally required. For example, a lender may have a regulatory foreclosure requirement that is policy based to provide notice to a borrower of a default of a loan, or other notifications relating to a transaction or loan that are advisory or helpful, rather than mandatory (although mandatory notices may also fall under a policy basis). Thus, in policy based uses of the regulatory foreclosure requirement term, a smart contract may process or trigger regulatory foreclosure requirements and provide appropriate notice to a borrower which may or may not necessarily be required by a law, rule, or code. The basis of the notice or communication may be out of prudence, courtesy, custom, industry practice, or obligation.

The term regulatory foreclosure requirements may also be utilized herein to describe an obligation or condition that is to be performed with regard to a specific user, such as a lender or a borrower. The regulatory notice may be specifically directed toward any party or entity, or a group of parties or entities. For example, a particular notice or communication may be advisable or required to be provided to a borrower, such as on circumstances of a borrower's failure to provide scheduled payments on a loan resulting in a default. As such, such a regulatory foreclosure requirement is directed to a particular user, such as a lender or borrower, and may be a result of a regulatory foreclosure requirement that is jurisdiction-specific or policy-based, or otherwise. For example, the foreclosure requirement may be related to a specific entity involved with a transaction (e.g., the current borrower has been a customer for 30 years, so s/he receives unique treatment), or to a class of entities (e.g., "preferred" borrowers, or "first time default" borrowers). Thus, in some circumstances a smart contract circuit may process or trigger an obligation or action that must be taken pursuant to a foreclosure, where the action is directed or from a specific party such as a lender or a borrower, which may or may not necessarily be required by a law, rule, or code, but may otherwise be provided out of prudence, courtesy, or custom. In certain embodiments, the obligation or condition that is to be performed with regard to the specific user may form a part of the terms and conditions or otherwise be known to the specific user to which it applies (e.g., an insurance company or bank that advertises a specific practice with regard to a specific class of customers, such as first-time default customers, first-time accident customers, etc.), and in certain embodiments the obligation or condition that is to be performed with regard to the specific user may be unknown to the specific user to which it applies (e.g., a bank has a policy relating to a class of users to which the specific user belongs, but the specific user is not aware of the classification).

The terms value, valuation, valuation model (and similar terms) as utilized herein should be understood broadly to describe an approach to evaluate and determine the estimated value for collateral. Without limitation to any other aspect or description of the present disclosure, a valuation model may be used in conjunction with: collateral (e.g. a secured property), artificial intelligence services (e.g. to improve a valuation model), data collection and monitoring services (e.g. to set a valuation amount), valuation services (e.g. the process of informing, using, and/or improving a valuation model), and/or outcomes relating to transactions in collateral (e.g. as a basis of improving the valuation model). "Jurisdiction-specific valuation model" is also used as a valuation model used in a specific geographic/jurisdictional area or region; wherein, the jurisdiction can be specific to jurisdiction of the lender, the borrower, the delivery of funds, the payment of the loan or the collateral of the loan, or combinations thereof. In certain embodiments, a jurisdiction-specific valuation model considers jurisdictional effects on a valuation of collateral, including at least: rights and obligations for borrowers and lenders in the relevant jurisdiction(s); jurisdictional effects on the ability to move, import, export, substitute, and/or liquidate the collateral; jurisdictional effects on the timing between default and foreclosure or collection of collateral; and/or jurisdictional effects on the volatility and/or sensitivity of collateral value determinations. In certain embodiments, a geolocation-specific valuation model considers geolocation effects on a valuation of the collateral, which may include a similar list of considerations relative jurisdictional effects (although the jurisdictional location(s) may be distinct from the geolocation(s)), but may also include additional effects, such as: weather-related effects; distance of the collateral from monitoring, maintenance, or seizure services; and/or proximity of risk phenomenon (e.g., fault lines, industrial locations, a nuclear plant, etc.). A valuation model may utilize a valuation of offset collateral (e.g., a similar item of collateral, a generic value such as a market value of similar or fungible collateral, and/or a value of an item that correlates with a value of the collateral) as a part of the valuation of the collateral. In certain embodiments, an artificial intelligence circuit includes one or more machine learning and/or artificial intelligence algorithms, to improve a valuation model, including, for example, utilizing information over time between multiple transactions involving similar or offset collateral, and/or utilizing outcome information (e.g., where loan transactions are completed successfully or unsuccessfully, and/or in response to collateral seizure or liquidation events that demonstrate real-world collateral valuation determinations) from the same or other transactions to iteratively improve the valuation model. In certain embodiments, an artificial intelligence circuit is trained on a collateral valuation data set, for example previously determined valuations and/or through interactions with a trainer (e.g., a human, accounting valuations, and/or other valuation data). In certain embodiments, the valuation model and/or parameters of the valuation model (e.g., assumptions, calibration values, etc.) may be determined and/or negotiated as a part of the terms and conditions of the transaction (e.g., a loan, a set of loans, and/or a subset of the set of loans). One of skill in the art, having the benefit of the disclosure herein and knowledge ordinarily available about a contemplated system, can readily determine which aspects of the present disclosure will benefit a particular application for a valuation model, and how to choose or combine valuation models to implement an embodiment of a valuation model. Certain considerations for the person of skill in the art, or embodiments of the present disclosure in choosing an appropriate valuation model, include, without limitation: the legal considerations of a valuation model given the jurisdiction of the collateral; the data available for a given collateral; the anticipated transaction/loan type(s); the specific type of collateral; the ratio of the loan to value; the ratio of the collateral to the loan; the gross transaction/loan amount; the credit scores of the borrower; accounting practices for the loan type and/or related industry; uncertainties related to any of the foregoing; and/or sensitivities related to any of the foregoing. While specific examples of valuation models and considerations are described herein for purposes of illustration, any embodiment benefitting from the disclosures herein, and any considerations understood to one of skill in the art having the benefit of the disclosures herein, are specifically contemplated within the scope of the present disclosure The term market value data, or marketplace information, (and other forms or variations) as utilized herein may be understood broadly to describe data or information relating to the valuation of a property, asset, collateral, or other valuable items which may be used as the subject of a loan, collateral, or transaction. Market value data or marketplace information may change from time to time, and may be estimated, calculated, or objectively or subjectively determined from various sources of information. Market value data or marketplace information may be related directly to an item of collateral or to an off-set item of collateral. Market value data or marketplace information may include financial data, market ratings, product ratings, customer data, market research to understand customer needs or preferences, competitive intelligence re. competitors, suppliers, and the like, entities sales, transactions, customer acquisition cost, customer lifetime value, brand awareness, churn rate, and the like. The term may occur in many different contexts of contracts or loans, such as lending, refinancing, consolidation, factoring, brokering, foreclosure, and data processing (e.g. data collection), or combinations thereof, without limitation. Market value data or marketplace information may be used as a noun to identify a single figure or a plurality of figures or data. For example, market value data or marketplace information may be utilized by a lender to determine if a property or asset will serve as collateral for a secured loan, or may alternatively be utilized in the determination of foreclosure if a loan is in default, without limitation to these circumstances in use of the term. Marketplace value data or marketplace information may also be used to determine loan-to-value figures or calculations. In certain embodiments, a collection service, smart contract circuit, and/or robotic process automation system may estimate or calculate market value data or marketplace information from one or more sources of data or information. In some cases market data value or marketplace information, depending upon the data/information contained therein, may enable automated action, or trigger other conditions or terms. One of skill in the art, having the benefit of the disclosure herein and knowledge ordinarily available about a contemplated system and available relevant marketplace information, can readily determine the purposes and use of this term in various forms, embodiments and contexts disclosed herein.

The terms similar collateral, similar to collateral, off-set collateral, and other forms or variations as utilized herein may be understood broadly to describe a property, asset or valuable item that may be like in nature to a collateral (e.g. an article of value held in security) regarding a loan or other transaction. Similar collateral may refer to a property, asset, collateral or other valuable item which may be aggregated, substituted, or otherwise referred to in conjunction with other collateral, whether the similarity comes in the form of a common attribute such as type of item of collateral, category of the item of collateral, an age of the item of collateral, a condition of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a geolocation of the item of collateral, and a jurisdictional location of the item of collateral, and the like. In certain embodiments, an offset collateral references an item that has a value correlation with an item of collateral—for example, an offset collateral may exhibit similar price movements, volatility, storage requirements, or the like for an item of collateral. In certain embodiments, similar collateral may be aggregated to form a larger security interest or collateral for an additional loan or distribution, or transaction. In certain embodiments, offset collateral may be utilized to inform a valuation of the collateral. In certain embodiments, a smart contract circuit or robotic process automation system may estimate or calculate figures, data or information relating to similar collateral, or may perform a function with respect to aggregating similar collateral. One of skill in the art, having the benefit of the disclosure herein and knowledge ordinarily available about a contemplated system can readily determine the purposes and use of similar collateral, offset collateral, or related terms as they relate to collateral in various forms, embodiments, and contexts disclosed herein.

The term restructure (and other forms such as restructuring) as utilized herein may be understood broadly to describe a modification of terms or conditions, properties, collateral, or other considerations affecting a loan or transaction. Restructuring may result in a successful outcome where amended terms or conditions are adopted between parties, or an unsuccessful outcome where no modification or restructure occurs, without limitation. Restructuring can occur in many contexts of contracts or loans, such as application, lending, refinancing, collection, consolidation, factoring, brokering, foreclosure, and combinations thereof, without limitation. Debt may also be restructured, which may indicate that debts owed to a party are modified as to timing, amounts, collateral, or other terms. For example, a borrower may restructure debt of a loan to accommodate a change of financial conditions, or a lender may offer to a borrower the restructuring of a debt for its own needs or prudence. In certain embodiments, a smart contract circuit or robotic process automation system may automatically or manually restructure debt based on a monitored condition, or create options for restructuring a debt, administrate the process of negotiating or effecting the restructuring of a debt, or other actions in connection with restructuring or modifying terms of a loan or transaction. One of skill in the art, having the benefit of the disclosure herein and knowledge ordinarily available about a contemplated system, can readily determine the purposes and use of this term, whether in the context of debt or otherwise, in various embodiments and contexts disclosed herein.

The term social network data collection, social network monitoring services, and social network data collection and monitoring services (and its various forms or derivatives) as utilized herein may be understood broadly to describe services relating to the acquisition, organizing, observing, or otherwise acting upon data or information derived from one or more social networks. The social network data collection and monitoring services may be a part of a related system of services or a standalone set of services. Social network data collection and monitoring services may be provided by a platform or system, without limitation. Social network data collection and monitoring services may be used in a variety of contexts such as lending, refinancing, negotiation, collection, consolidation, factoring, brokering, foreclosure, and combinations thereof, without limitation. Requests of social network data collection and monitoring, with configuration parameters, may be requested by other services, automatically initiated, or triggered to occur based on conditions or circumstances that occur. An interface may be provided to configure, initiate, display, or otherwise interact with social network data collection and monitoring services. Social networks, as utilized herein, reference any mass platform where data and communications occur between individuals and/or entities, where the data and communications are at least partially accessible to an embodiment system. In certain embodiments, the social network data includes publicly available (e.g., accessible without any authorization) information. In certain embodiments, the social network data includes information that is properly accessible to an embodiment system, but may include subscription access or other access to information that is not freely available to the public, but may be accessible (e.g., consistent with a privacy policy of the social network with its users). A social network may be primarily social in nature, but may additionally or alternatively include professional networks, alumni networks, industry related networks, academically oriented networks, or the like. In certain embodiments, a social network may be a crowdsourcing platform, such as a platform configured to accept queries or requests directed to users (and/or a subset of users, potentially meeting specified criteria), where users may be aware that certain communications will be shared and accessible to requestors, at least a portion of users of the platform, and/or publicly available. In certain embodiments, without limitation, social network data collection and monitoring services may be performed by a smart contract circuit or a robotic process automation system. One of skill in the art, having the benefit of the disclosure herein and knowledge ordinarily available about a contemplated system, can readily determine the purposes and use of social network data collection and monitoring services in various embodiments and contexts disclosed herein.

The term crowdsource and social network information as utilized herein may further be understood broadly to describe information acquired or provided in conjunction with a crowdsourcing model or transaction, or information acquired or provided on or in conjunction with a social network. Crowdsource and social network information may be provided by a platform or system, without limitation. Crowdsource and social network information may be acquired, provided, or communicated to or from a group of information suppliers and by which responses to the request may be collected and processed. Crowdsource and social network information may provide information, conditions or factors relating to a loan or agreement. Crowdsource and social network information may be private or published, or combinations thereof, without limitation. In certain embodiments, without limitation, crowdsource and social network information may be acquired, provided, organized, or processed, without limitation, by a smart contract circuit, wherein the crowdsource and social network information may be managed by a smart contract circuit that processes the information to satisfy a set of configured parameters. One of skill in the art, having the benefit of the disclosure herein and knowledge ordinarily available about a contemplated system can readily determine the purposes and use of this term in various embodiments and contexts disclosed herein.

The term negotiate (and other forms such as negotiating or negotiation) as utilized herein may be understood broadly to describe discussions or communications to bring about or obtain a compromise, outcome, or agreement between parties or entities. Negotiation may result in a successful outcome where terms are agreed between parties, or an unsuccessful outcome where the parties do not agree to specific terms, or combinations thereof, without limitation. A negotiation may be successful in one aspect or for a particular purpose, and unsuccessful in another aspect or for another purpose. Negotiation can occur in many contexts of contracts or loans, such as lending, refinancing, collection, consolidation, factoring, brokering, foreclosure, and combinations thereof, without limitation. For example, a borrower may negotiate an interest rate or loan terms with a lender. In another example, a borrower in default may negotiate an alternative resolution to avoid foreclosure with a lender. In certain embodiments, a smart contract circuit or robotic process automation system may negotiate for one or more of the parties, and process appropriate tasks for completing or attempting to complete a negotiation of terms. In some cases negotiation by the smart contract or robotic process automation system may not complete or be successful. Successful negotiation may enable automated action or trigger other conditions or terms to be implemented by the smart contract circuit or robotic process automation system. One of skill in the art, having the benefit of the disclosure herein and knowledge ordinarily available about a contemplated system, can readily determine the purposes and use of negotiation in various embodiments and contexts disclosed herein.

The term negotiate in various forms may more specifically be utilized herein in verb form (e.g., to negotiate) or in noun forms (e.g., a negotiation), or other forms to describe a context of mutual discussion leading to an outcome. For example, a robotic process automation system may negotiate terms and conditions on behalf of a party, which would be a use as a verb clause. In another example, a robotic process automation system may be negotiating terms and conditions for modification of a loan, or negotiating a consolidation offer, or other terms. As a noun clause, a negotiation (e.g., an event) may be performed by a robotic process automation system. Thus, in some circumstances a smart contract circuit or robotic process automation system may negotiate (e.g., as a verb clause) terms and conditions, or the description of doing so may be considered a negotiation (e.g., as a noun clause). One of skill in the art, having the benefit of the disclosure herein and knowledge about negotiating and negotiation, or other forms of the word negotiate, can readily determine the purposes and use of this term in various embodiments and contexts disclosed herein.

The term negotiate in various forms may also specifically be utilized to describe an outcome, such as a mutual compromise or completion of negotiation leading to an outcome. For example, a loan may, by robotic process automation system or otherwise, be considered negotiated as a successful outcome that has resulted in an agreement between parties, where the negotiation has reached completion. Thus, in some circumstances a smart contract circuit or robotic process automation system may have negotiated to completion a set of terms and conditions, or a negotiated loan. One of skill in the art, having the benefit of the disclosure herein and knowledge ordinarily available for a contemplated system, can readily determine the purposes and use of this term as it relates to a mutually agreed outcome through completion of negotiation in various embodiments and contexts disclosed herein.

The term negotiate in various forms may also specifically be utilized to characterize an event such as a negotiating event, or an event negotiation, including reaching a set of agreeable terms between parties. An event requiring mutual agreement or compromise between parties may be considered a negotiating event, without limitation. For example, during the procurement of a loan, the process of reaching a mutually acceptable set of terms and conditions between parties could be considered a negotiating event. Thus, in some circumstances a smart contract circuit or robotic process automation system may accommodate the communications, actions, or behaviors of the parties for a negotiated event.

The term collection (and other forms such as collect or collecting) as utilized herein may be understood broadly to describe the acquisition of a tangible (e.g., physical item), intangible (e.g., data, a license, or a right), or monetary (e.g., payment) item, or other obligation or asset from a source. The term generally may relate to the entire prospective acquisition of such an item from related tasks in early stages to related tasks in late stages or full completion of the acquisition of the item. Collection may result in a successful outcome where the item is tendered to a party, or may or an unsuccessful outcome where the item is not tendered or acquired to a party, or combinations thereof (e.g., a late or otherwise deficient tender of the item), without limitation. Collection may occur in many different contexts of contracts or loans, such as lending, refinancing, consolidation, factoring, brokering, foreclosure, and data processing (e.g., data collection), or combinations thereof, without limitation. Collection may be used in the form of a noun (e.g., data collection or the collection of an overdue payment where it refers to an event or characterizes an event), may refer as a noun to an assortment of items (e.g., a collection of collateral for a loan where it refers to a number of items in a transaction), or may be used in the form of a verb (e.g., collecting a payment from the borrower). For example, a lender may collect an overdue payment from a borrower through an online payment, or may have a successful collection of overdue payments acquired through a customer service telephone call. In certain embodiments, a smart contract circuit or robotic process automation system may perform collection for one or more of the parties, and process appropriate tasks for completing or attempting collection for one or more items (e.g., an overdue payment). In some cases negotiation by the smart contract or robotic process automation system may not complete or be successful, and depending upon such outcomes this may enable automated action or trigger other conditions or terms. One of skill in the art, having the benefit of the disclosure herein and knowledge ordinarily available about a contemplated system, can readily determine the purposes and use of collection in various forms, embodiments, and contexts disclosed herein.

The term collection in various forms may also more specifically be utilized herein in noun form to describe a context for an event or thing, such as a collection event, or a collection payment. For example, a collection event may refer to a communication to a party or other activity that relates to acquisition of an item in such an activity, without limitation. A collection payment, for example, may relate to a payment made by a borrower that has been acquired through the process of collection, or through a collection department with a lender. Although not limited to an overdue, delinquent, or defaulted loan, collection may characterize an event, payment or department, or other noun associated with a transaction or loan, as being a remedy for something that has become overdue. Thus, in some circumstances a smart contract circuit or robotic process automation system may collect a payment or installment from a borrower, and the activity of doing so may be considered a collection event, without limitation.

The term collection in various forms may also more specifically be utilized herein as an adjective or other forms to describe a context relating to litigation, such as the outcome of a collection litigation (e.g., litigation regarding overdue or default payments on a loan). For example, the outcome of a collection litigation may be related to delinquent payments which are owed by a borrower or other party, and collection efforts relating to those delinquent payments may be litigated by parties. Thus, in some circumstances a smart contract circuit or robotic process automation system may receive, determine, or otherwise administrate the outcome of collection litigation.

The term collection in various forms may also more specifically be utilized herein as an adjective or other forms to describe a context relating to an action of acquisition, such as a collection action (e.g., actions to induce tendering or acquisition of overdue or default payments on a loan or other obligation). The terms collection yield, financial yield of collection, and/or collection financial yield may be used. The result of such a collection action may or may not have a financial yield. For example, a collection action may result in the payment of one or more outstanding payments on a loan, which may render a financial yield to another party such as the lender. Thus, in some circumstances a smart contract circuit or robotic process automation system may render a financial yield from a collection action, or otherwise administrate or in some manner assist in a financial yield of a collection action. In embodiments, a collection action may include the need for collection litigation.

The term collection in various forms (collection ROI, ROI on collection, ROI on collection activity, collection activity ROI, and the like) may also more specifically be utilized herein to describe a context relating to an action of receiving value, such as a collection action (e.g. actions to induce tendering or acquisition of overdue or default payments on a loan or other obligation), wherein there is a return on investment (ROI). The result of such a collection action may or may not have an ROI, either with respect to the collection action itself (as an ROI on the collection action) or as an ROI on the broader loan or transaction that is the subject of the collection action. For example, an ROI on a collection action may be prudent or not with respect to a default loan, without limitation, depending upon whether the ROI will be provided to a party such as the lender. A projected ROI on collection may be estimated, or may also be calculated given real events that transpire. In some circumstances, a smart contract circuit or robotic process automation system may render an estimated ROI for a collection action or collection event, or may calculate an ROI for actual events transpiring in a collection action or collection event, without limitation. In embodiments, such a ROI may be a positive or negative figure, whether estimated or actual.

The term reputation, measure of reputation, lender reputation, borrower reputation, entity reputation, and the like may include general, widely held beliefs, opinions, and/or perceptions that are generally held about an individual, entity, collateral, and the like. A measure for reputation may be determined based on social data including likes/dislikes, review of entity or products and services provided by the entity, rankings of the company or product, current and historic market and financial data include price, forecast, buy/sell recommendations, financial news regarding entity, competitors, and partners. Reputations may be cumulative in that a product reputation and the reputation of a company leader or lead scientist may influence the overall reputation of the entity. Reputation of an institute associated with an entity (e.g., a school being attended by a student) may influence the reputation of the entity. In some circumstances, a smart contract circuit or robotic process automation system may collect, or initiate collection of data related to the above and determine a measure or ranking of reputation. A measure or ranking of an entity's reputation may be used by a smart contract circuit or robotic process automation system in determining whether to enter into an agreement with the entity, determination of terms and conditions of a loan, interest rates, and the like. In certain embodiments, indicia of a reputation determination may be related to outcomes of one or more transactions (e.g., a comparison of "likes" on a particular social media data set to an outcome index, such as successful payments, successful negotiation outcomes, ability to liquidate a particular type of collateral, etc.) to determine the measure or ranking of an entity's reputation. One of skill in the art, having the benefit of the disclosure herein and knowledge ordinarily available about a contemplated system, can readily determine the purposes and use of the reputation, a measure or ranking of the reputation, and/or utilization of the reputation in negotiations, determination of terms and conditions, determination of whether to proceed with a transaction, and other various embodiments and contexts disclosed herein.

The term collection in various forms (e.g., collector) may also more specifically be utilized herein to describe a party or entity that induces, administrates, or facilitates a collection action, collection event, or other collection related context. The measure of reputation of a party involved, such as a collector, or during the context of a collection, may be estimated or calculated using objective, subjective, or historical metrics or data. For example, a collector may be involved in a collection action, and the reputation of that collector may be used to determine decisions, actions, or conditions. Similarly, a collection may be also used to describe objective, subjective or historical metrics or data to measure the reputation of a party involved, such as a lender, borrower, or debtor. In some circumstances, a smart contract circuit or robotic process automation system may render a collection or measures, or implement a collector, within the context of a transaction or loan.

The term collection and data collection in various forms, including data collection systems, may also more specifically be utilized herein to describe a context relating to the acquisition, organization, or processing of data, or combinations thereof, without limitation. The result of such a data collection may be related or wholly unrelated to a collection of items (e.g., grouping of the items, either physically or logically), or actions taken for delinquent payments (e.g., collection of collateral, a debt, or the like), without limitation. For example, a data collection may be performed by a data collection system, wherein data is acquired, organized, or processed for decision-making, monitoring, or other purposes of prospective or actual transaction or loan. In some circumstances, a smart contract or robotic process automation system may incorporate data collection or a data collection system, to perform portions or entire tasks of data collection, without limitation. One of skill in the art, having the benefit of the disclosure herein and knowledge ordinarily available for a contemplated system, can readily determine and distinguish the purposes and use of collection in the context of data or information as used herein.

The terms refinance, refinancing activity (ies), refinancing interactions, refinancing outcomes, and similar terms, as utilized herein should be understood broadly. Without limitation to any other aspect or description of the present disclosure refinance and refinancing activities include replacing an existing mortgage, loan, bond, debt transaction, or the like with a new mortgage, loan, bond, or debt transaction that pays off or ends the previous financial arrangement. In certain embodiments, any change to terms and conditions of a loan, and/or any material change to terms and conditions of a loan, may be considered a refinancing activity. In certain embodiments, a refinancing activity is considered only those changes to a loan agreement that result in a different financial outcome for the loan agreement. Typically, the new loan should be advantageous to the borrower or issuer, and/or mutually agreeable (e.g., improving a raw financial outcome of one, and a security or other outcome for the other). Refinancing may be done to reduce interest rates, lower regular payments, change the loan term, change the collateral associated with the loan, consolidate debt into a single loan, restructure debt, change a type of loan (e.g., variable rate to fixed rate), pay off a loan that is due, in response to an improved credit score, to enlarge the loan, and/or in response to a change in market conditions (e.g., interest rates, value of collateral, and the like).

Refinancing activity may include initiating an offer to refinance, initiating a request to refinance, configuring a refinancing interest rate, configuring a refinancing payment schedule, configuring a refinancing balance in a response to the amount or terms of the refinanced loan, configuring collateral for a refinancing including changes in collateral used, changes in terms and conditions for the collateral, a change in the amount of collateral and the like, managing use of proceeds of a refinancing, removing or placing a lien on different items of collateral as appropriate given changes in terms and conditions as part of a refinancing, verifying title for a new or existing item of collateral to be used to secure the refinanced loan, managing an inspection process title for a new or existing item of collateral to be used to secure the refinanced loan, populating an application to refinance a loan, negotiating terms and conditions for a refinanced loan and closing a refinancing. Refinance and refinancing activities may be disclosed in the context of data collection and monitoring services that collect a training set of interactions between entities for a set of loan refinancing activities. Refinance and refinancing activities may be disclosed in the context of an artificial intelligence system that is trained using the collected training set of interactions that includes both refinancing activities and outcomes. The trained artificial intelligence may then be used to recommend a refinance activity, evaluate a refinance activity, make a prediction around an expected outcome of refinancing activity, and the like. Refinance and refinancing activities may be disclosed in the context of smart contract systems which may automate a subset of the interactions and activities of refinancing. In an example, a smart contract system may automatically adjust an interest rate for a loan based on information collected via at least one of an Internet of Things system, a crowdsourcing system, a set of social network analytic services and a set of data collection and monitoring services. The interest rate may be adjusted based on rules, thresholds, model parameters that determine, or recommend, an interest rate for refinancing a loan based on interest rates available to the lender from secondary lenders, risk factors of the borrower (including predicted risk based on one or more predictive models using artificial intelligence), marketing factors (such as competing interest rates offered by other lenders), and the like. Outcomes and events of a refinancing activity may be recorded in a distributed ledger. Based on the outcome of a refinance activity, a smart contract for the refinance loan may be automatically reconfigured to define the terms and conditions for the new loan such as a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

One of skill in the art, having the benefit of the disclosure herein and knowledge ordinarily available about a contemplated system can readily determine which aspects of the present disclosure will benefit from a particular application of a refinance activity, how to choose or combine refinance activities, how to implement systems, services, or circuits to automatically perform of one or more (or all) aspects of a refinance activity, and the like. Certain considerations for the person of skill in the art, or embodiments of the present disclosure in choosing an appropriate training sets of interactions with which to train an artificial intelligence to take action, recommend or predict the outcome of certain refinance activities. While specific examples of refinance and refinancing activities are described herein for purposes of illustration, any embodiment benefitting from the disclosures herein, and any considerations understood to one of skill in the art having the benefit of the disclosures herein, are specifically contemplated within the scope of the present disclosure.

The terms consolidate, consolidation activity (ies), loan consolidation, debt consolidation, consolidation plan, and similar terms, as utilized herein should be understood broadly. Without limitation to any other aspect or description of the present disclosure consolidate, consolidation activity (ies), loan consolidation, debt consolidation, or consolidation plan are related to the use of a single large loan to pay off several smaller loans, and/or the use of one or more of a set of loans to pay off at least a portion of one or more of a second set of loans. In embodiments, loan consolidation may be secured (i.e., backed by collateral) or unsecured. Loans may be consolidated to obtain a lower interest rate than one or more of the current loans, to reduce total monthly loan payments, and/or to bring a debtor into compliance on the consolidated loans or other debt obligations of the debtor. Loans that may be classified as candidates for consolidation may be determined based on a model that processes attributes of entities involved in the set of loans including identity of a party, interest rate, payment balance, payment terms, payment schedule, type of loan, type of collateral, financial condition of party, payment status, condition of collateral, and value of collateral. Consolidation activities may include managing at least one of identification of loans from a set of candidate loans, preparation of a consolidation offer, preparation of a consolidation plan, preparation of content communicating a consolidation offer, scheduling a consolidation offer, communicating a consolidation offer, negotiating a modification of a consolidation offer, preparing a consolidation agreement, executing a consolidation agreement, modifying collateral for a set of loans, handling an application workflow for consolidation, managing an inspection, managing an assessment, setting an interest rate, deferring a payment requirement, setting a payment schedule, and closing a consolidation agreement. In embodiments, there may be systems, circuits, and/or services configured to create, configure (such as using one or more templates or libraries), modify, set, or otherwise handle (such as in a user interface) various rules, thresholds, conditional procedures, workflows, model parameters, and the like to determine, or recommend, a consolidation action or plan for a lending transaction or a set of loans based on one or more events, conditions, states, actions, or the like. In embodiments, a consolidation plan may be based on various factors, such as the status of payments, interest rates of the set of loans, prevailing interest rates in a platform marketplace or external marketplace, the status of the borrowers of a set of loans, the status of collateral or assets, risk factors of the borrower, the lender, one or more guarantors, market risk factors and the like. Consolidation and consolidation activities may be disclosed in the context of data collection and monitoring services that collect a training set of interactions between entities for a set of loan consolidation activities. consolidation and consolidation activities may be disclosed in the context of an artificial intelligence system that is trained using the collected training set of interactions that includes both consolidation activities and outcomes associated with those activities. The trained artificial intelligence may then be used to recommend a consolidation activity, evaluate a consolidation activity, make a prediction around an expected outcome of consolidation activity, and the like based models including status of debt, condition of collateral or assets used to secure or back a set of loans, the state of a business or business operation (e.g., receivables, payables, or the like), conditions of parties (such as net worth, wealth, debt, location, and other conditions), behaviors of parties (such as behaviors indicating preferences, behaviors indicating debt preferences), and others. Debt consolidation, loan consolidation and associated consolidation activities may be disclosed in the context of smart contract systems which may automate a subset of the interactions and activities of consolidation. In embodiments, consolidation may include consolidation with respect to terms and conditions of sets of loans, selection of appropriate loans, configuration of payment terms for consolidated loans, configuration of payoff plans for pre-existing loans, communications to encourage consolidation, and the like. In embodiments, the artificial intelligence of a smart contract may automatically recommend or set rules, thresholds, actions, parameters and the like (optionally by learning to do so based on a training set of outcomes over time), resulting in a recommended consolidation plan, which may specify a series of actions required to accomplish a recommended or desired outcome of consolidation (such as within a range of acceptable outcomes), which may be automated and may involve conditional execution of steps based on monitored conditions and/or smart contract terms, which may be created, configured, and/or accounted for by the consolidation plan. Consolidation plans may be determined and executed based at least one part on market factors (such as competing interest rates offered by other lenders, values of collateral, and the like) as well as regulatory and/or compliance factors. Consolidation plans may be generated and/or executed for creation of new consolidated loans, for secondary loans related to consolidated loans, for modifications of existing loans related to consolidation, for refinancing terms of a consolidated loan, for foreclosure situations (e.g., changing from secured loan rates to unsecured loan rates), for bankruptcy or insolvency situations, for situations involving market changes (e.g., changes in prevailing interest rates) and others. consolidation.

Certain of the activities related to loans, collateral, entities, and the like may apply to a wide variety of loans and may not apply explicitly to consolidation activities. The categorization of the activities as consolidation activities may be based on the context of the loan for which the activities are taking place. However, one of skill in the art, having the benefit of the disclosure herein and knowledge ordinarily available about a contemplated system can readily determine which aspects of the present disclosure will benefit from a particular application of a consolidation activity, how to choose or combine consolidation activities, how to implement selected services, circuits, and/or systems described herein to perform certain loan consolidation operations, and the like. While specific examples of consolidation and consolidation activities are described herein for purposes of illustration, any embodiment benefitting from the disclosures herein, and any considerations understood to one of skill in the art having the benefit of the disclosures herein, are specifically contemplated within the scope of the present disclosure.

The terms factoring a loan, factoring a loan transaction, factors, factoring a loan interaction, factoring assets or sets of assets used for factoring and similar terms, as utilized herein should be understood broadly. Without limitation to any other aspect or description of the present disclosure factoring may be applied to factoring assets such as invoices, inventory, accounts receivable, and the like, where the realized value of the item is in the future. For example, the accounts receivable is worth more when it has been paid and there is less risk of default. Inventory and Work in Progress (WIP) may be worth more as final product rather than components. References to accounts receivable should be understood to encompass these terms and not be limiting. Factoring may include a sale of accounts receivable at a discounted rate for value in the present (often cash). Factoring may also include the use of accounts receivable as collateral for a short term loan. In both cases the value of the accounts receivable or invoices may be discounted for multiple reasons including the future value of money, a term of the accounts receivable (e.g., 30 day net payment vs. 90 day net payment), a degree of default risk on the accounts receivable, a status of receivables, a status of work-in-progress (WIP), a status of inventory, a status of delivery and/or shipment, financial condition(s) of parties owing against the accounts receivable, a status of shipped and/or billed, a status of payments, a status of the borrower, a status of inventory, a risk factor of a borrower, a lender, one or more guarantors, market risk factors, a status of debt (are there other liens present on the accounts receivable or payment owed on the inventory, a condition of collateral assets (e.g. the condition of the inventory, is it current or out of date, are invoices in arrears), a state of a business or business operation, a condition of a party to the transaction (such as net worth, wealth, debt, location, and other conditions), a behavior of a party to the transaction (such as behaviors indicating preferences, behaviors indicating negotiation styles, and the like), current interest rates, any current regulatory and compliance issues associated with the inventory or accounts receivable (e.g., if inventory is being factored, has the intended product received appropriate approvals), and there legal actions against the borrower, and many others, including predicted risk based on one or more predictive models using artificial intelligence). A factor is an individual, business, entity, or groups thereof which agree to provide value in exchange for either the outright acquisition of the invoices in a sale or the use of the invoices as collateral for a loan for the value. Factoring a loan may include the identification of candidates (both lenders and borrowers) for factoring, a plan for factoring specifying the proposed receivables (e.g., all, some, only those meeting certain criteria), and a proposed discount factor, communication of the plan to potential parties, proffering an offer and receiving an offer, verification of quality of receivables, conditions regarding treatment of the receivables for the term of the loan. While specific examples of factoring and factoring activities are described herein for purposes of illustration, any embodiment benefitting from the disclosures herein, and any considerations understood to one of skill in the art having the benefit of the disclosures herein, are specifically contemplated within the scope of the present disclosure.

The terms mortgage, brokering a mortgage, mortgage collateral, mortgage loan activities, and/or mortgage related activities as utilized herein should be understood broadly. Without limitation to any other aspect or description of the present disclosure, a mortgage is an interaction where a borrower provides the title or a lien on the title of an item of value, typically property, to a lender as security in exchange for money or another item of value, to be repaid, typically with interest, to the lender. The exchange includes the condition that, upon repayment of the loan, the title reverts to the borrower and/or the lien on the property is removed. The brokering of a mortgage may include the identification of potential properties, lenders, and other parties to the loan, and arranging or negotiating the terms of the mortgage. Certain components or activities may not be considered mortgage related individually, but may be considered mortgage related when used in conjunction with a mortgage, act upon a mortgage, are related to an entity or party to a mortgage, and the like. For example, brokering may apply to the offering of a variety of loans including unsecured loans, outright sale of property and the like. Mortgage activities and mortgage interactions may include mortgage marketing activity, identification of a set of prospective borrowers, identification of property to mortgage, identification of collateral property to mortgage, qualification of borrower, title search and/or title verification for prospective mortgage property, property assessment, property inspection, or property valuation for prospective mortgage property, income verification, borrower demographic analysis, identification of capital providers, determination of available interest rates, determination of available payment terms and conditions, analysis of existing mortgage(s), comparative analysis of existing and new mortgage terms, completion of application workflow (e.g., keep the application moving forward by initiating next steps in the process as appropriate), population of fields of application, preparation of mortgage agreement, completion of schedule for mortgage agreement, negotiation of mortgage terms and conditions with capital provider, negotiation of mortgage terms and conditions with borrower, transfer of title, placement of lien on mortgaged property and closing of mortgage agreement, and similar terms, as utilized herein should be understood broadly. While specific examples of mortgages and mortgage brokering are described herein for purposes of illustration, any embodiment benefitting from the disclosures herein, and any considerations understood to one of skill in the art having the benefit of the disclosures herein, are specifically contemplated within the scope of the present disclosure.

The terms debt management, debt transactions, debt actions, debt terms and conditions, syndicating debt, consolidating debt, and/or debt portfolios, as utilized herein should be understood broadly. Without limitation to any other aspect or description of the present disclosure a debt includes something of monetary value that is owed to another. A loan typically results in the borrower holding the debt (e.g., the money that must be paid back according to the terms of the loan, which may include interest). Consolidation of debt includes the use of a new, single loan to pay back multiple loans (or various other configurations of debt structuring as described herein, and as understood to one of skill in the art). Often the new loan may have better terms or lower interest rates. Debt portfolios include a number of pieces or groups of debt, often having different characteristics including term, risk, and the like. Debt portfolio management may involve decisions regarding the quantity and quality of the debt being held and how best to balance the various debts to achieve a desired risk/reward position based on: investment policy, return on risk determinations for individual pieces of debt, or groups of debt. Debt may be syndicated where multiple lenders fund a single loan (or set of loans) to a borrower. Debt portfolios may be sold to a third party (e.g., at a discounted rate). Debt compliance includes the various measures taken to ensure that debt is repaid. Demonstrating compliance may include documentation of the actions taken to repay the debt.

Transactions related to a debt (debt transactions) and actions related to the debt (debt actions) may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, and/or consolidating debt. Debt terms and conditions may include a balance of debt, a principal amount of debt, a fixed interest rate, a variable interest rate, a payment amount, a payment schedule, a balloon payment schedule, a specification of assets that back the bond, a specification of substitutability of assets, a party, an issuer, a purchaser, a guarantee, a guarantor, a security, a personal guarantee, a lien, a duration, a covenant, a foreclose condition, a default condition, and a consequence of default. While specific examples of debt management and debt management activities are described herein for purposes of illustration, any embodiment benefitting from the disclosures herein, and any considerations understood to one of skill in the art having the benefit of the disclosures herein, are specifically contemplated within the scope of the present disclosure.

The terms condition, condition classification, classification models, condition management, and similar terms, as utilized herein should be understood broadly. Without limitation to any other aspect or description of the present disclosure condition, condition classification, classification models, condition management, include classifying or determining a condition of an asset, issuer, borrower, loan, debt, bond, regulatory status, term or condition for a bond, loan or debt transaction that is specified and monitored in the contract, and the like. Based on a classified condition of an asset, condition management may include actions to maintain or improve a condition of the asset or the use of that asset as collateral. Based on a classified condition of an issuer, borrower, party regulatory status, and the like, condition management may include actions to alter the terms or conditions of a loan or bond. Condition classification may include various rules, thresholds, conditional procedures, workflows, model parameters, and the like to classify a condition of an asset, issuer, borrower, loan, debt, bond, regulatory status, term or condition for a bond, loan or debt transaction, and the like based on data from Internet of Things devices, data from a set of environmental condition sensors, data from a set of social network analytic services and a set of algorithms for querying network domains, social media data, crowdsourced data, and the like. Condition classification may include grouping or labeling entities, or clustering the entities, as similarly positioned with regard to some aspect of the classified condition (e.g., a risk, quality, ROI, likelihood for recovery, likelihood to default, or some other aspect of the related debt).

Various classification models are disclosed where the classification and classification model may be tied to a geographic location relating to the collateral, the issuer, the borrower, the distribution of the funds or other geographic locations. Classification and classification models are disclosed where artificial intelligence is used to improve a classification model (e.g. refine a model by making refinements using artificial intelligence data). Thus artificial intelligence may be considered, in some instances, as a part of a classification model and vice versa. Classification and classification models are disclosed where social media data, crowdsourced data, or IoT data is used as input for refining a model, or as input to a classification model. Examples of IoT data may include images, sensor data, location data, and the like. Examples of social media data or crowdsourced data may include behavior of parties to the loan, financial condition of parties, adherence to a parties to a term or condition of the loan, or bond, or the like. Parties to the loan may include issuers of a bond, related entities, lender, borrower, 3rd parties with an interest in the debt. Condition management may be discussed in connection with smart contract services which may include condition classification, data collection and monitoring, and bond, loan, and debt transaction management. Data collection and monitoring services are also discussed in conjunction with classification and classification models which are related when classifying an issuer of a bond issuer, an asset or collateral asset related to the bond, collateral assets backing the bond, parties to the bond, and sets of the same. In some embodiments a classification model may be included when discussing bond types. Specific steps, factors or refinements may be considered a part of a classification model. In various embodiments, the classification model may change both in an embodiment, or in the same embodiment which is tied to a specific jurisdiction. Different classification models may use different data sets (e.g., based on the issuer, the borrower, the collateral assets, the bond type, the loan type, and the like) and multiple classification models may be used in a single classification. For example, one type of bond, such as a municipal bond, may allow a classification model that is based on bond data from municipalities of similar size and economic prosperity, whereas another classification model may emphasize data from IoT sensors associated with a collateral asset. Accordingly, different classification models will offer benefits or risks over other classification models, depending upon the embodiment and the specifics of the bond, loan, or debt transaction. A classification model includes an approach or concept for classification. Conditions classified for a bond, loan, or debt transaction may include a principal amount of debt, a balance of debt, a fixed interest rate, a variable interest rate, a payment amount, a payment schedule, a balloon payment schedule, a specification of assets that back the bond, loan or debt transaction, a specification of substitutability of assets, a party, an issuer, a purchaser, a guarantee, a guarantor, a security, a personal guarantee, a lien, a duration, a covenant, a foreclose condition, a default condition, and/or a consequence of default. Conditions classified may include type of bond issuer such as a municipality, a corporation, a contractor, a government entity, a non-governmental entity, and a non-profit entity. Entities may include a set of issuers, a set of bonds, a set of parties, and/or a set of assets. Conditions classified may include an entity condition such as net worth, wealth, debt, location, and other conditions), behaviors of parties (such as behaviors indicating preferences, behaviors indicating debt preferences), and the like. Conditions classified may include an asset or type of collateral such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. Conditions classified may include a bond type where bond type may include a municipal bond, a government bond, a treasury bond, an asset-backed bond, and a corporate bond. Conditions classified may include a default condition, a foreclosure condition, a condition indicating violation of a covenant, a financial risk condition, a behavioral risk condition, a policy risk condition, a financial health condition, a physical defect condition, a physical health condition, an entity risk condition, and an entity health condition. Conditions classified may include an environment where environment may include an environment selected from among a municipal environment, a corporate environment, a securities trading environment, a real property environment, a commercial facility, a warehousing facility, a transportation environment, a manufacturing environment, a storage environment, a home, and a vehicle. Actions based on the condition of an asset, issuer, borrower, loan, debt, bond, regulatory status and the like, may include managing, reporting on, syndicating, consolidating, or otherwise handling a set of bonds (such as municipal bonds, corporate bonds, performance bonds, and others), a set of loans (subsidized and unsubsidized, debt transactions and the like, monitoring, classifying, predicting, or otherwise handling the reliability, quality, status, health condition, financial condition, physical condition or other information about a guarantee, a guarantor, a set of collateral supporting a guarantee, a set of assets backing a guarantee, or the like. Bond transaction activities in response to a condition of the bond may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, and/or consolidating debt.

One of skill in the art, having the benefit of the disclosure herein and knowledge ordinarily available about a contemplated system, can readily determine which aspects of the present disclosure will benefit a particular application for a classification model, how to choose or combine classification models to arrive at a condition, and/or calculate a value of collateral given the required data. Certain considerations for the person of skill in the art, or embodiments of the present disclosure in choosing an appropriate condition to manage, include, without limitation: the legality of the condition given the jurisdiction of the transaction, the data available for a given collateral, the anticipated transaction type (loan, bond or debt), the specific type of collateral, the ratio of the loan to value, the ratio of the collateral to the loan, the gross transaction/loan amount, the credit scores of the borrower and the lender, and other considerations. While specific examples of conditions, condition classification, classification models, and condition management are described herein for purposes of illustration, any embodiment benefitting from the disclosures herein, and any considerations understood to one of skill in the art having the benefit of the disclosures herein, are specifically contemplated within the scope of the present disclosure.

The terms classify, classifying, classification, categorization, categorizing, categorize (and similar terms) as utilized herein should be understood broadly. Without limitation to any other aspect or description of the present disclosure, classifying a condition or item may include actions to sort the condition or item into a group or category based on some aspect, attribute, or characteristic of the condition or item where the condition or item is common or similar for all the items placed in that classification, despite divergent classifications or categories based on other aspects or conditions at the time. Classification may include recognition of one or more parameters, features, characteristics, or phenomena associated with a condition or parameter of an item, entity, person, process, item, financial construct, or the like. Conditions classified by a condition classifying system may include a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, and/or an entity health condition. A classification model may automatically classify or categorize items, entities, process, items, financial constructs or the like based on data received from a variety of sources. The classification model may classify items based on a single attribute or a combination of attributes, and/or may utilize data regarding the items to be classified and a model. The classification model may classify individual items, entities, financial constructs, or groups of the same. A bond may be classified based on the type of bond (e.g., municipal bonds, corporate bonds, performance bonds, and the like), rate of return, bond rating (3rd party indicator of bond quality with respect to bond issuer's financial strength, and/or ability to bap bond's principal and interest, and the like. Lenders or bond issuers may be classified based on the type of lender or issuer, permitted attributes (e.g. based on income, wealth, location (domestic or foreign), various risk factors, status of issuers, and the like. Borrowers may be classified based on permitted attributes (e.g. income, wealth, total assets, location, credit history), risk factors, current status (e.g., employed, a student), behaviors of parties (such as behaviors indicating preferences, reliability, and the like), and the like. A condition classifying system may classify a student recipient of a loan based on progress of the student toward a degree, the student's grades or standing in their classes, students' status at the school (matriculated, on probation and the like), the participation of a student in a non-profit activity, a deferment status of the student, and the participation of the student in a public interest activity. Conditions classified by a condition classifying system may include a state of a set of collateral for a loan or a state of an entity relevant to a guarantee for a loan. Conditions classified by a condition classifying system may include a medical condition of a borrower, guarantor, subsidizer, or the like. Conditions classified by a condition classifying system may include compliance with at least one of a law, a regulation, or a policy related to a lending transaction or lending institute. Conditions classified by a condition classifying system may include a condition of an issuer for a bond, a condition of a bond, a rating of a loan-related entity, and the like. Conditions classified by a condition classifying system may include an identify of a machine, a component, or an operational mode. Conditions classified by a condition classifying system may include a state or context (such as a state of a machine, a process, a workflow, a marketplace, a storage system, a network, a data collector, or the like). A condition classifying system may classify a process involving a state or context (e.g., a data storage process, a network coding process, a network selection process, a data marketplace process, a power generation process, a manufacturing process, a refining process, a digging process, a boring process, and/or other process described herein. A condition classifying system may classify a set of loan refinancing actions based on a predicted outcome of the set of loan refinancing actions. A condition classifying system may classify a set of loans as candidates for consolidation based on attributes such as identity of a party, an interest rate, a payment balance, payment terms, payment schedule, a type of loan, a type of collateral, a financial condition of party, a payment status, a condition of collateral, a value of collateral, and the like. A condition classifying system may classify the entities involved in a set of factoring loans, bond issuance activities, mortgage loans, and the like. A condition classifying system may classify a set of entities based on projected outcomes from various loan management activities. A condition classifying system may classify a condition of a set of issuers based on information from Internet of Things data collection and monitoring services, a set of parameters associated with an issuer, a set of social network monitoring and analytic services, and the like. A condition classifying system may classify a set of loan collection actions, loan consolidation actions, loan negotiation actions, loan refinancing actions and the like based on a set of projected outcomes for those activities and entities.

The term subsidized loan, subsidizing a loan, (and similar terms) as utilized herein should be understood broadly. Without limitation to any other aspect or description of the present disclosure, a subsidized loan is the loan of money or an item of value wherein payment of interest on the value of the loan may be deferred, postponed, or delayed, with or without accrual, such as while the borrower is in school, is unemployed, is ill, and the like. In embodiments, a loan may be subsidized when the payment of interest on a portion or subset of the loan is borne or guaranteed by someone other than the borrower. Examples of subsidized loans may include a municipal subsidized loan, a government subsidized loan, a student loan, an asset-backed subsidized loan, and a corporate subsidized loan. An example of a subsidized student loan may include student loans which may be subsidized by the government and on which interest may be deferred or not accrue based on progress of the student toward a degree, the participation of a student in a non-profit activity, a deferment status of the student, and the participation of the student in a public interest activity. An example of a government subsidized housing loan may include governmental subsidies which may exempt the borrower from paying closing costs, first mortgage payment and the like. Conditions for such subsidized loans may include location of the property (rural or urban), income of the borrower, military status of the borrower, ability of the purchased home to meet health and safety standards, a limit on the profits you can earn on the sale of your home, and the like. Certain usages of the word loan may not apply to a subsidized loan but rather to a regular loan. One of skill in the art, having the benefit of the disclosure herein and knowledge about a contemplated system ordinarily available to that person, can readily determine which aspects of the present disclosure will benefit from consideration of a subsidized loan (e.g., in determining the value of the loan, negotiations related to the loan, terms and conditions related to the loan, etc.) wherein the borrower may be relieved of some of the loan obligations common for non-subsidized loans, where the subsidy may include forgiveness, delay or deferment of interest on a loan, or the payment of the interest by a third party. The subsidy may include the payment of closing costs including points, first payment and the like by a person or entity other than the borrower, and/or how to combine processes and systems from the present disclosure to enhance or benefit from title validation.

The term subsidized loan management (and similar terms) as utilized herein should be understood broadly. Without limitation to any other aspect or description of the present disclosure, subsidized loan management may include a plurality of activities and solutions for managing or responding to one or more events related to a subsidized loan wherein such events may include requests for a subsidized loan, offering a subsidized loan, accepting a subsidized loan, providing underwriting information for a subsidized loan, providing a credit report on a borrower seeking a subsidized loan, deferring a required payment as part of the loan subsidy, setting an interest rate for a subsidized loan where a lower interest rate may be part of the subsidy, deferring a payment requirement as part of the loan subsidy, identifying collateral for a loan, validating title for collateral or security for a loan, recording a change in title of property, assessing the value of collateral or security for a loan, inspecting property that is involved in a loan, identifying a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, modifying terms and conditions for a loan, for setting terms and conditions for a loan (such as a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default), or managing loan-related activities (such as, without limitation, finding parties interested in participating in a loan transaction, handling an application for a loan, underwriting a loan, forming a legal contract for a loan, monitoring performance of a loan, making payments on a loan, restructuring or amending a loan, settling a loan, monitoring collateral for a loan, forming a syndicate for a loan, foreclosing on a loan, collecting on a loan, consolidating a set of loans, analyzing performance of a loan, handling a default of a loan, transferring title of assets or collateral, and closing a loan transaction), and the like. In embodiments, a system for handling a subsidized loan may include classifying a set of parameters of a set of subsidized loans on the basis of data relating to those parameters obtained from an Internet of Things data collection and monitoring service. Classifying the set of parameters of the set of subsidized loans may also be on the bases of data obtained from one or more configurable data collection and monitoring services that leverage social network analytic services, crowd sourcing services, and the like for obtaining parameter data (e.g., determination that a person or entity is qualified for the subsidized loan, determining a social value of providing the subsidized loan or removing a subsidization from a loan, determining that a subsidizing entity is legitimate, determining appropriate subsidization terms based on characteristics of the buyer and/or subsidizer, etc.).

The term foreclose, foreclosure, foreclose or foreclosure condition, default foreclosure collateral, default collateral, (and similar terms) as utilized herein should be understood broadly. Without limitation to any other aspect or description of the present disclosure, foreclose condition, default and the like describe the failure of a borrower to meet the terms of a loan. Without limitation to any other aspect or description of the present disclosure foreclose and foreclosure include processes by which a lender attempts to recover, from a borrower in a foreclose or default condition, the balance of a loan or take away in lieu, the right of a borrower to redeem a mortgage held in security for the loan. Failure to meet the terms of the loan may include failure to make specified payments, failure to adhere to a payment schedule, failure to make a balloon payment, failure to appropriately secure the collateral, failure to sustain collateral in a specified condition (e.g. in good repair), acquisition of a second loan, and the like. Foreclosure may include a notification to the borrower, the public, jurisdictional authorities of the forced sale of an item collateral such as through a foreclosure auction. Upon foreclosure, an item of collateral may be placed on a public auction site (such as eBay, Ñø or an auction site appropriate for a particular type of property. The minimum opening bid for the item of collateral may be set by the lender and may cover the balance of the loan, interest on the loan, fees associated with the foreclosure and the like. Attempts to recover the balance of the loan may include the transfer of the deed for an item of collateral in lieu of foreclosure (e.g., a real-estate mortgage where the borrower holds the deed for a property which acts as collateral for the mortgage loan). Foreclosure may include taking possession of or repossessing the collateral (e.g., a car, a sports vehicle such as a boat, ATV, ski-mobile, jewelry). Foreclosure may include securing an item of collateral associated with the loan (such as by locking a connected device, such as a smart lock, smart container, or the like that contains or secures collateral). Foreclosure may include arranging for the shipping of an item of collateral by a carrier, freight forwarder of the like. Foreclosure may include arranging for the transport of an item of collateral by a drone, a robot, or the like for transporting collateral. In embodiments, a loan may allow for the substitution of collateral or the shifting of the lien from an item of collateral initially used to secure the loan to a substitute collateral where the substitute collateral is of higher value (to the lender) than the initial collateral or is an item in which the borrower has a greater equity. The result of the substitution of collateral is that when the loan goes into foreclosure, it is the substitute collateral that may be the subject of a forced sale or seizure. Certain usages of the word default may not apply to such as to foreclose but rather to a regular or default condition of an item. One of skill in the art, having the benefit of the disclosure herein and knowledge about a contemplated system ordinarily available to that person, can readily determine which aspects of the present disclosure will benefit from foreclosure, and/or how to combine processes and systems from the present disclosure to enhance or benefit from foreclosure. Certain considerations for the person of skill in the art, in determining whether the term foreclosure, foreclose condition, default and the like is referring to failure of a borrower to meet the terms of a loan and the related attempts by the lender to recover the balance of the loan or obtain ownership of the collateral.

The terms validation of tile, title validation, validating title, and similar terms, as utilized herein should be understood broadly. Without limitation to any other aspect or description of the present disclosure validation of title and title validation include any efforts to verify or confirm the ownership or interest by an individual or entity in an item of property such as a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. Efforts to verify ownership may include reference to bills of sale, government documentation of transfer of ownership, a legal will transferring ownership, documentation of retirement of liens on the item of property, verification of assignment of Intellectual Property to the proposed borrower in the appropriate jurisdiction, and the like. For real-estate property validation may include a review of deeds and records at a courthouse of a country, a state, a county, or a district in which a building, a home, real estate property, undeveloped land, a farm, a crop, a municipal facility, a vehicle, a ship, a plane, or a warehouse is located or registered. Certain usages of the word validation may not apply to validation of a title or title validation but rather to confirmation that a process is operating correctly, that an individual has been correctly identified using biometric data, that intellectual property rights are in effect, that data is correct and meaningful, and the like. One of skill in the art, having the benefit of the disclosure herein and knowledge about a contemplated system ordinarily available to that person, can readily determine which aspects of the present disclosure will benefit from title validation, and/or how to combine processes and systems from the present disclosure to enhance or benefit from title validation. Certain considerations for the person of skill in the art, in determining whether the term validation is referring to title validation, are specifically contemplated within the scope of the present disclosure.

Without limitation to any other aspect or description of the present disclosure, validation includes any validating system including, without limitation, validating title for collateral or security for a loan, validating conditions of collateral for security or a loan, validating conditions of a guarantee for a loan, and the like. For instance, a validation service may provide lenders a mechanism to deliver loans with more certainty, such as through validating loan or security information components (e.g., income, employment, title, conditions for a loan, conditions of collateral, and conditions of an asset). In a non-limiting example, a validation service circuit may be structured to validate a plurality of loan information components with respect to a financial entity configured to determine a loan condition for an asset. Certain components may not be considered a validating system individually, but may be considered validating in an aggregated system—for example, an Internet of Things component may not be considered a validating component on its own, however an Internet of Things component utilized for asset data collection and monitoring may be considered a validating component when applied to validating a reliability parameter of a personal guarantee for a load when the Internet of Things component is associated with a collateralized asset. In certain embodiments, otherwise similar looking systems may be differentiated in determining whether such systems are for validation. For example, a blockchain-based ledger may be used to validate identities in one instance and to maintain confidential information in another instance. Accordingly, the benefits of the present disclosure may be applied in a wide variety of systems, and any such systems may be considered a system for validation herein, while in certain embodiments a given system may not be considered a validating system herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a validating system and/or whether aspects of the present disclosure can benefit or enhance the contemplated system include, without limitation: a lending platform having a social network monitoring system for validating the reliability of a guarantee for a loan; a lending platform having an Internet of Things data collection and monitoring system for validating reliability of a guarantee for a loan; a lending platform having a crowdsourcing and automated classification system for validating conditions of an issuer for a bond; a crowdsourcing system for validating quality, title, or other conditions of collateral for a loan; a biometric identify validation application such as utilizing DNA or fingerprints; IoT devices utilized to collectively validate location and identity of a fixed asset that is tagged by a virtual asset tag; validation systems utilizing voting or consensus protocols; artificial intelligence systems trained to recognize and validate events; validating information such as title records, video footage, photographs, or witnessed statements; validation representations related to behavior, such as to validate occurrence of conditions of compliance, to validate occurrence of conditions of default, to deter improper behavior or misrepresentations, to reduce uncertainty, or to reduce asymmetries of information; and the like.

The term underwriting (and similar terms) as utilized herein should be understood broadly. Without limitation to any other aspect or description of the present disclosure, underwriting includes any underwriting, including, without limitation, relating to underwriters, providing underwriting information for a loan, underwriting a debt transaction, underwriting a bond transaction, underwriting a subsidized loan transaction, underwriting a securities transaction, and the like. Underwriting services may be provided by financial entities, such as banks, insurance or investment houses, and the like, whereby the financial entity guarantees payment in case of a determination of a loss condition (e.g., damage or financial loss) and accept the financial risk for liability arising from the guarantee. For instance, a bank may underwrite a loan through a mechanism to perform a credit analysis that may lead to a determination of a loan to be granted, such as through analysis of personal information components related to an individual borrower requesting a consumer loan (e.g., employment history, salary and financial statements publicly available information such as the borrower's credit history), analysis of business financial information components from a company requesting a commercial load (e.g., tangible net worth, ratio of debt to worth (leverage), and available liquidity (current ratio)), and the like. In a non-limiting example, an underwriting services circuit may be structured to underwrite a financial transaction including a plurality of financial information components with respect to a financial entity configured to determine a financial condition for an asset. In certain embodiments, underwriting components may be considered underwriting for some purposes but not for other purposes—for example, an artificial intelligence system to collect and analyze transaction data may be utilized in conjunction with a smart contract platform to monitor loan transactions, but alternately used to collect and analyze underwriting data, such as utilizing a model trained by human expert underwriters. Accordingly, the benefits of the present disclosure may be applied in a wide variety of systems, and any such systems may be considered underwriting herein, while in certain embodiments a given system may not be considered underwriting herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is underwriting and/or whether aspects of the present disclosure can benefit or enhance the contemplated system include, without limitation: a lending platform having an underwriting system for a loan with a set of data-integrated microservices such as including data collection and monitoring services, blockchain services, artificial intelligence services, and smart contract services for underwriting lending entities and transactions; underwriting processes, operations, and services; underwriting data, such as data relating to identities of prospective and actual parties involved insurance and other transactions, actuarial data, data relating to probability of occurrence and/or extent of risk associated with activities, data relating to observed activities and other data used to underwrite or estimate risk; an underwriting application, such as, without limitation, for underwriting any insurance offering, any loan, or any other transaction, including any application for detecting, characterizing or predicting the likelihood and/or scope of a risk, an underwriting or inspection flow about an entity serving a lending solution, an analytics solution, or an asset management solution; underwriting of insurance policies, loans, warranties, or guarantees; a blockchain and smart contract platform for aggregating identity and behavior information for insurance underwriting, such as with an optional distributed ledger to record a set of events, transactions, activities, identities, facts, and other information associated with an underwriting process; a crowdsourcing platform such as for underwriting of various types of loans, and guarantees; an underwriting system for a loan with a set of data-integrated microservices including data collection and monitoring services, blockchain services, artificial intelligence services, and smart contract services for underwriting lending entities and transactions; an underwriting solution to create, configure, modify, set or otherwise handle various rules, thresholds, conditional procedures, workflows, or model parameters; an underwriting action or plan for management a set of loans of a given type or types based on one or more events, conditions, states, actions, secondary loans or transactions to back loans, for collection, consolidation, foreclosure, situations of bankruptcy or insolvency, modifications of existing loans, situations involving market changes, foreclosure activities; adaptive intelligent systems including artificial intelligent models trained on a training set of underwriting activities by experts and/or on outcomes of underwriting actions to generate a set of predictions, classifications, control instructions, plans, models; underwriting system for a loan with a set of data-integrated microservices including data collection and monitoring services, blockchain services, artificial intelligence services, and smart contract services for underwriting lending entities and transactions; and the like.

The term insuring (and similar terms) as utilized herein should be understood broadly. Without limitation to any other aspect or description of the present disclosure, insuring includes any insuring, including, without limitation, providing insurance for a loan, providing evidence of insurance for an asset related to a loan, a first entity accepting a risk or liability for another entity, and the like. Insuring, or insurance, may be a mechanism through which a holder of the insurance is provided protection from a financial loss, such as in a form of risk management against the risk of a contingent or uncertain loss. The insuring mechanism may provide for an insurance, determine the need for an insurance, determine evidence of insurance, and the like, such as related to an asset, transaction for an asset, loan for an asset, security, and the like. An entity which provides insurance may be known as an insurer, insurance company, insurance carrier, underwriter, and the like. For instance, a mechanism for insuring may provide a financial entity with a mechanism to determine evidence of insurance for an asset related to a loan. In a non-limiting example, an insurance service circuit may be structured to determine an evidence condition of insurance for an asset based on a plurality of insurance information components with respect to a financial entity configured to determine a loan condition for an asset. In certain embodiments, components may be considered insuring for some purposes but not for other purposes, for example, a blockchain and smart contract platform may be utilized to manage aspects of a loan transaction such as for identity and confidentiality, but may alternately be utilized to aggregate identity and behavior information for insurance underwriting. Accordingly, the benefits of the present disclosure may be applied in a wide variety of systems, and any such systems may be considered insuring herein, while in certain embodiments a given system may not be considered insuring herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is insuring and/or whether aspects of the present disclosure can benefit or enhance the contemplated system include, without limitation: insurance facilities such as branches, offices, storage facilities, data centers, underwriting operations and others; insurance claims, such as for business interruption insurance, product liability insurance, insurance on goods, facilities, or equipment, flood insurance, insurance for contract-related risks, and many others, as well as claims data relating to product liability, general liability, workers compensation, injury and other liability claims and claims data relating to contracts, such as supply contract performance claims, product delivery requirements, contract claims, claims for damages, claims to redeem points or rewards, claims of access rights, warranty claims, indemnification claims, energy production requirements, delivery requirements, timing requirements, milestones, key performance indicators and others; insurance-related lending; an insurance service, an insurance brokerage service, a life insurance service, a health insurance service, a retirement insurance service, a property insurance service, a casualty insurance service, a finance and insurance service, a reinsurance service; a blockchain and smart contract platform for aggregating identity and behavior information for insurance underwriting; identities of applicants for insurance, identities of parties that may be willing to offer insurance, information regarding risks that may be insured (of any type, without limitation, such as property, life, travel, infringement, health, home, commercial liability, product liability, auto, fire, flood, casualty, retirement, unemployment; distributed ledger may be utilized to facilitate offering and underwriting of microinsurance, such as for defined risks related to defined activities for defined time periods that are narrower than for typical insurance policies; providing insurance for a loan, providing evidence of insurance for property related to a loan; and the like.

The term aggregation (and similar terms) as utilized herein should be understood broadly. Without limitation to any other aspect or description of the present disclosure, an aggregation or to aggregate includes any aggregation including, without limitation, aggregating items together, such as aggregating or linking similar items together (e.g., collateral to provide collateral for a set of loans, collateral items for a set of loans is aggregated in real time based on a similarity in status of the set of items, and the like), collecting data together (e.g., for storage, for communication, for analysis, as training data for a model, and the like), summarizing aggregated items or data into a simpler description, or any other method for creating a whole formed by combining several (e.g., disparate) elements. Further, an aggregator may be any system or platform for aggregating, such as described. Certain components may not be considered aggregation individually but may be considered aggregation in an aggregated system—for example, a collection of loans may not be considered an aggregation of loans of itself but may be an aggregation if collected as such. In a non-limiting example, an aggregation circuit may be structured to provide lenders a mechanism to aggregate loans together from a plurality of loans, such as based on a loan attribute, parameter, term or condition, financial entity, and the like, to become an aggregation of loans. In certain embodiments, an aggregation may be considered an aggregation for some purposes but not for other purposes, for example, an aggregation of asset collateral conditions may be collected for the purpose of aggregating loans together in one instance and for the purpose of determining a default action in another instance. Additionally, in certain embodiments, otherwise similar looking systems may be differentiated in determining whether such systems are aggregators, and/or which type of aggregating systems. For example, a first and second aggregator may both aggregate financial entity data, where the first aggregator aggregates for the sake of building a training set for an analysis model circuit and where the second aggregator aggregates financial entity data for storage in a blockchain-based distributed ledger. Accordingly, the benefits of the present disclosure may be applied in a wide variety of systems, and any such systems may be considered as aggregation herein, while in certain embodiments a given system may not be considered aggregation herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is aggregation and/or whether aspects of the present disclosure can benefit or enhance the contemplated system include, without limitation forward market demand aggregation (e.g., blockchain and smart contract platform for forward market demand aggregation, interest expressed or committed in a demand aggregation interface, blockchain used to aggregate future demand in a forward market with respect to a variety of products and services, process a set of potential configurations having different parameters for a subset of configurations that are consistent with each other and the subset of configurations used to aggregate committed future demand for the offering that satisfies a sufficiently large subset at a profitable price, and the like); correlated aggregated data (including trend information) on worker ages, credentials, experience (including by process type) with data on the processes in which those workers are involved; demand for accommodations aggregated in advance and conveniently fulfilled by automatic recognition of conditions that satisfy pre-configured commitments represented on a blockchain (e.g., distributed ledger); transportation offerings aggregated and fulfilled (e.g., with a wide range of pre-defined contingencies); aggregation of goods and services on the blockchain (e.g., a distributed ledger used for demand planning); with respect to a demand aggregation interface (e.g., presented to one or more consumers); aggregation of multiple submissions; aggregating identity and behavior information (e.g., insurance underwriting); accumulation and aggregation of multiple parties; aggregation of data for a set of collateral; aggregated value of collateral or assets (e.g., based on real time condition monitoring, rea-time market data collection and integration, and the like); aggregated tranches of loans; collateral for smart contract aggregated with other similar collateral; and the like.

The term linking (and similar terms) as utilized herein should be understood broadly. Without limitation to any other aspect or description of the present disclosure, linking includes any linking, including, without limitation, linking as a relationship between two things or situations (e.g., where one thing affects the other). For instance, linking a subset of similar items such as collateral to provide collateral for a set of loans. Certain components may not be considered linked individually, but may be considered in a process of linking in an aggregated system—for example, a smart contracts circuit may be structured to operate in conjunction with a blockchain circuit as part of a loan processing platform but where the smart contracts circuit processes contracts without storing information through the blockchain circuit, however the two circuits could be linked through the smart contracts circuit linking financial entity information through a distributed ledger on the blockchain circuit. In certain embodiments, linking may be considered linking for some purposes but not for other purposes, for example, linking goods and services for users and radio frequency linking between access points are different forms of linking, where the linking of goods and services for users links thinks together while an RF link is a communications link between transceivers. Additionally, in certain embodiments, otherwise similar looking systems may be differentiated in determining whether such system are linking, and/or which type of linking. For example, linking similar data together for analysis is different from linking similar data together for graphing. Accordingly, the benefits of the present disclosure may be applied in a wide variety of systems, and any such systems may be considered linking herein, while in certain embodiments a given system may not be considered a linking herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is linking and/or whether aspects of the present disclosure can benefit or enhance the contemplated system include, without limitation linking marketplaces or external marketplaces with a system or platform; linking data (e.g., data cluster including links and nodes); storage and retrieval of data linked to local processes; links (e.g. with respect to nodes) in a common knowledge graph; data linked to proximity or location (e.g., of the asset); linking to an environment (e.g., goods, services, assets, and the like); linking events (e.g., for storage such as in a blockchain, for communication or analysis); linking ownership or access rights; linking to access tokens (e.g., travel offerings linked to access tokens); links to one or more resources (e.g., secured by cryptographic or other techniques); linking a message to a smart contract; and the like.

The term indicator of interest (and similar terms) as utilized herein should be understood broadly. Without limitation to any other aspect or description of the present disclosure, an indicator of interest includes any indicator of interest including, without limitation, an indicator of interest from a user or plurality of users or parties related to a transaction and the like (e.g., parties interested in participating in a loan transaction), the recording or storing of such an interest (e.g., a circuit for recording an interest input from a user, entity, circuit, system, and the like), a circuit analyzing interest related data and setting an indicator of interest (e.g., a circuit setting or communicating an indicator based on inputs to the circuit, such as from users, parties, entities, systems, circuits, and the like), a model trained to determine an indicator of interest from input data related to an interest by one of a plurality of inputs from users, parties, or financial entities, and the like. Certain components may not be considered indicators of interest individually, but may be considered an indicator of interest in an aggregated system, for example, a party may seek information relating to a transaction such as though a translation marketplace where the party is interested in seeking information, but that may not be considered an indicator of interest in a transaction. However, when the party asserts a specific interest (e.g., through a user interface with control inputs for indicating interest) the party's interest may be recorded (e.g., in a storage circuit, in a blockchain circuit), analyzed (e.g., through an analysis circuit, a data collection circuit), monitored (e.g., through a monitoring circuit), and the like. In a non-limiting example, indicators of interest may be recorded (e.g., in a blockchain through a distributed ledger) from a set of parties with respect to the product, service, or the like, such as ones that define parameters under which a party is willing to commit to purchase a product or service. In certain embodiments, an indicator of interest may be considered an indicator of interest for some purposes but not for other purposes—for example, a user may indicate an interest for a loan transaction but that does not necessarily mean the user is indicating an interest in providing a type of collateral related to the loan transaction. For instance, a data collection circuit may record an indicator of interest for the transaction but may have a separate circuit structure for determining an indication of interest for collateral. Additionally, in certain embodiments, otherwise similar looking systems may be differentiated in determining whether such system are determining an indication of interest, and/or which type of indicator of interest exists. For example, one circuit or system may collect data from a plurality of parties to determine an indicator of interest in securing a loan and a second circuit or system may collect data from a plurality of parties to determine an indicator of interest in determining ownership rights related to a loan. Accordingly, the benefits of the present disclosure may be applied in a wide variety of systems, and any such systems may be considered an indicator of interest herein, while in certain embodiments a given system may not be considered an indicator of interest herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is an indicator of interest and/or whether aspects of the present disclosure can benefit or enhance the contemplated system include, without limitation parties indicating an interest in participating in a transaction (e.g., a loan transaction), parties indicating an interest in securing in a product or service, recording or storing an indication of interest (e.g., through a storage circuit or blockchain circuit), analyzing an indication of interest (e.g., through a data collection and/or monitoring circuit), and the like.

The term accommodations (and similar terms) as utilized herein should be understood broadly. Without limitation to any other aspect or description of the present disclosure, an accommodation includes any service, activity, event, and the like such as including, without limitation, a room, group of rooms, table, seating, building, event, shared spaces offered by individuals (e.g., Airbnb spaces), bed-and-breakfasts, workspaces, conference rooms, convention spaces, fitness accommodations, health and wellness accommodations, dining accommodations, and the like, in which someone may live, stay, sit, reside, participate, and the like. As such, an accommodation may be purchased (e.g., a ticket through a sports ticketing application), reserved or booked (e.g., a reservation through a hotel reservation application), provided as a reward or gift, traded or exchanged (e.g., through a marketplace), provided as an access right (e.g., offering by way of an aggregation demand), provided based on a contingency (e.g., a reservation for a room being contingent on the availability of a nearby event), and the like. Certain components may not be considered an accommodation individually but may be considered an accommodation in an aggregated system—for example, a resource such as a room in a hotel may not in itself be considered an accommodation but a reservation for the room may be. For instance, a blockchain and smart contract platform for forward market rights for accommodations may provide a mechanism to provide access rights with respect to accommodations. In a non-limiting example, a blockchain circuit may be structured to store access rights in a forward demand market, where the access rights may be stored in a distributed ledger with related shared access to a plurality of actionable entities. In certain embodiments, an accommodation may be considered an accommodation for some purposes but not for other purposes, for example, a reservation for a room may be an accommodation on its own, but may not be accommodation that is satisfied if a related contingency is not met as agreed upon at the time of the e.g., reservation. Additionally, in certain embodiments, otherwise similar looking systems may be differentiated in determining whether such systems are related to an accommodation, and/or which type of accommodation. For example, an accommodation offering may be made based on different systems, such as one where the accommodation offering is determined by a system collecting data related to forward demand and a second one where the accommodation offering is provided as a reward based on a system processing a performance parameter. Accordingly, the benefits of the present disclosure may be applied in a wide variety of systems, and any such systems may be considered as related to an accommodation herein, while in certain embodiments a given system may not be considered related to an accommodation herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is related to accommodation and/or whether aspects of the present disclosure can benefit or enhance the contemplated system include, without limitation accommodations provided as determined through a service circuit, trading or exchanging services (e.g., through an application and/or user interface), as an accommodation offering such as with respect to a combination of products, services, and access rights, processed (e.g., aggregation demand for the offering in a forward market), accommodation through booking in advance, accommodation through booking in advance upon meeting a certain condition (e.g., relating to a price within a given time window), and the like.

The term contingencies (and similar terms) as utilized herein should be understood broadly. Without limitation to any other aspect or description of the present disclosure, a contingency includes any contingency including, without limitation, any action that is dependent upon a second action. For instance, a service may be provided as contingent on a certain parameter value, such as collecting data as condition upon an asset tag indication from an Internet of Things circuit. In another instance, an accommodation such as a hotel reservation may be contingent upon a concert (local to the hotel and at the same time as the reservation) proceeding as scheduled. Certain components may not be considered as relating to a contingency individually, but may be considered related to a contingency in an aggregated system—for example, a data input collected from a data collection service circuit may be stored, analyzed, processed, and the like, and not be considered with respect to a contingency, however a smart contracts service circuit may apply a contract term as being contingent upon the collected data. For instance, the data may indicate a collateral status with respect to a loan transaction, and the smart contracts service circuit may apply that data to a term of contract that depends upon the collateral. In certain embodiments, a contingency may be considered contingency for some purposes but not for other purposes—for example, a delivery of contingent access rights for a future event may be contingent upon a loan condition being satisfied, but the loan condition on its own may not be considered a contingency in the absence of the contingency linkage between the condition and the access rights. Additionally, in certain embodiments, otherwise similar looking systems may be differentiated in determining whether such systems are related to a contingency, and/or which type of contingency. For example, two algorithms may both create a forward market event access right token, but where the first algorithm creates the token free of contingencies and the second algorithm creates a token with a contingency for delivery of the token. Accordingly, the benefits of the present disclosure may be applied in a wide variety of systems, and any such systems may be considered a contingency herein, while in certain embodiments a given system may not be considered a contingency herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a contingency and/or whether aspects of the present disclosure can benefit or enhance the contemplated system include, without limitation a forward market operated within or by the platform may be a contingent forward market, such as one where a future right is vested, is triggered, or emerges based on the occurrence of an event, satisfaction of a condition, or the like; a blockchain used to make a contingent market in any form of event or access token by securely storing access rights on a distributed ledger; setting and monitoring pricing for contingent access rights, underlying access rights, tokens, fees and the like; optimizing offerings, timing, pricing, or the like, to recognize and predict patterns, to establish rules and contingencies; exchanging contingent access rights or underlying access rights or tokens access tokens and/or contingent access tokens; creating a contingent forward market event access right token where a token may be created and stored on a blockchain for contingent access right that could result in the ownership of a ticket; discovery and delivery of contingent access rights to future events; contingencies that influence or represent future demand for an offering, such as including a set of products, services, or the like; pre-defined contingencies; optimized offerings, timing, pricing, or the like, to recognize and predict patterns, to establish rules and contingencies; creation of a contingent future offering within the dashboard; contingent access rights that may result in the ownership of the virtual good or each smart contract to purchase the virtual good if and when it becomes available under defined conditions; and the like.

The term level of service (and similar terms) as utilized herein should be understood broadly. Without limitation to any other aspect or description of the present disclosure, a level of service includes any level of service including, without limitation, any qualitative or quantitative measure of the extent to which a service is provided, such as, and without limitation, a first class vs. business class service (e.g., travel reservation or postal delivery), the degree to which a resource is available (e.g., service level A indicating that the resource is highly available vs. service level C indicating that the resource is constrained, such as in terms of traffic flow restrictions on a roadway), the degree to which an operational parameter is performing (e.g., a system is operating at a high state of service vs a low state of service, and the like. In embodiments, level of service may be multi-modal such that the level of service is variable where a system or circuit provides a service rating (e.g., where the service rating is used as an input to an analytical circuit for determining an outcome based on the service rating). Certain components may not be considered relative to a level of service individually, but may be considered relative to a level of service in an aggregated system, for example a system for monitoring a traffic flow rate may provide data on a current rate but not indicate a level of service, but when the determined traffic flow rate is provided to a monitoring circuit the monitoring circuit may compare the determined traffic flow rate to past traffic flow rates and determine a level of service based on the comparison. In certain embodiments, a level of service may be considered a level of service for some purposes but not for other purposes, for example, the availability of first class travel accommodation may be considered a level of service for determining whether a ticket will be purchased but not to project a future demand for the flight. Additionally, in certain embodiments, otherwise similar looking systems may be differentiated in determining whether such system utilizes a level of service, and/or which type of level of service. For example, an artificial intelligence circuit may be trained on past level of service with respect to traffic flow patterns on a certain freeway and used to predict future traffic flow patterns based on current flow rates, but a similar artificial intelligence circuit may predict future traffic flow patterns based on the time of day. Accordingly, the benefits of the present disclosure may be applied in a wide variety of systems, and any such systems may be considered with respect to levels of service herein, while in certain embodiments a given system may not be considered with respect to levels of service herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a level of service and/or whether aspects of the present disclosure can benefit or enhance the contemplated system include, without limitation transportation or accommodation offerings with predefined contingencies and parameters such as with respect to price, mode of service, and level of service; warranty or guarantee application, transportation marketplace, and the like.

The term payment (and similar terms) as utilized herein should be understood broadly. Without limitation to any other aspect or description of the present disclosure, a payment includes any payment including, without limitation, an action or process of paying (e.g., a payment to a loan) or of being paid (e.g., a payment from insurance), an amount paid or payable (e.g., a payment of $1000 being made), a repayment (e.g., to pay back a loan), a mode of payment (e.g., use of loyalty programs, rewards points, or particular currencies, including cryptocurrencies) and the like. Certain components may not be considered payments individually, but may be considered payments in an aggregated system—for example, submitting an amount of money may not be considered a payment as such, but when applied to a payment to satisfy the requirement of a loan may be considered a payment (or repayment). For instance, a data collection circuit may provide lenders a mechanism to monitor repayments of a loan. In a non-limiting example, the data collection circuit may be structured to monitor the payments of a plurality of loan components with respect to a financial loan contract configured to determine a loan condition for an asset. In certain embodiments, a payment may be considered a payment for some purposes but not for other purposes—for example, a payment to a financial entity may be for a repayment amount to pay back the loan, or it may be to satisfy a collateral obligation in a loan default condition. Additionally, in certain embodiments, otherwise similar looking systems may be differentiated in determining whether such system are related to a payment, and/or which type of payment. For example, funds may be applied to reserve an accommodation or to satisfy the delivery of services after the accommodation has been satisfied. Accordingly, the benefits of the present disclosure may be applied in a wide variety of systems, and any such systems may be considered a payment herein, while in certain embodiments a given system may not be considered a payment herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a payment and/or whether aspects of the present disclosure can benefit or enhance the contemplated system include, without limitation, deferring a required payment; deferring a payment requirement; payment of a loan; a payment amount; a payment schedule; a balloon payment schedule; payment performance and satisfaction; modes of payment; and the like.

The term location (and similar terms) as utilized herein should be understood broadly. Without limitation to any other aspect or description of the present disclosure, a location includes any location including, without limitation, a particular place or position of a person, place, or item, or location information regarding the position of a person, place, or item, such as a geolocation (e.g., geolocation of a collateral), a storage location (e.g., the storage location of an asset), a location of a person (e.g., lender, borrower, worker), location information with respect to the same, and the like. Certain components may not be considered with respect to location individually, but may be considered with respect to location in an aggregated system, for example, a smart contract circuit may be structured to specify a requirement for a collateral to be stored at a fixed location but not specify the specific location for a specific collateral. In certain embodiments, a location may be considered a location for some purposes but not for other purposes—for example, the address location of a borrower may be required for processing a loan in one instance, and a specific location for processing a default condition in another instance. Additionally, in certain embodiments, otherwise similar looking systems may be differentiated in determining whether such system are a location, and/or which type of location. For example, the location of a music concert may be required to be in a concert hall seating 10,000 people in one instance but specify the location of an actual concert hall in another. Accordingly, the benefits of the present disclosure may be applied in a wide variety of systems, and any such systems may be considered with respect to a location herein, while in certain embodiments a given system may not be considered with respect to a location herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is considered with respect to a location and/or whether aspects of the present disclosure can benefit or enhance the contemplated system include, without limitation a geolocation of an item or collateral; a storage location of item or asset; location information; location of a lender or a borrower; location-based product or service targeting application; a location-based fraud detection application; indoor location monitoring systems (e.g., cameras, IR systems, motion-detection systems); locations of workers (including routes taken through a location); location parameters; event location; specific location of an event; and the like.

The term route (and similar terms) as utilized herein should be understood broadly. Without limitation to any other aspect or description of the present disclosure, a route includes any route including, without limitation, a way or course taken in getting from a starting point to a destination, to send or direct along a specified course, and the like. Certain components may not be considered with respect to a route individually, but may be considered a route in an aggregated system—for example, a mobile data collector may specify a requirement for a route for collecting data based on an input from a monitoring circuit, but only in receiving that input does the mobile data collector determine what route to take and begin traveling along the route. In certain embodiments, a route may be considered a route for some purposes but not for other purposes—for example possible routes through a road system may be considered differently than specific routes taken through from one location to another location. Additionally, in certain embodiments, otherwise similar looking systems may be differentiated in determining whether such systems are specified with respect to a location, and/or which types of locations. For example, routes depicted on a map may indicate possible routes or actual routes taken by individuals. Accordingly, the benefits of the present disclosure may be applied in a wide variety of systems, and any such systems may be considered with respect to a route herein, while in certain embodiments a given system may not be considered with respect to a route herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is utilizing a route and/or whether aspects of the present disclosure can benefit or enhance the contemplated system include, without limitation delivery routes; routes taken through a location; heat map showing routes traveled by customers or workers within an environment; determining what resources are deployed to what routes or types of travel; direct route or multi-stop route, such as from the destination of the consumer to a specific location or to wherever an event takes place; a route for a mobile data collector; and the like.

The term future offering (and similar terms) as utilized herein should be understood broadly. Without limitation to any other aspect or description of the present disclosure, a future offing includes any offer of an item or service in the future including, without limitation, a future offer to provide an item or service, a future offer with respect to a proposed purchase, a future offering made through a forward market platform, a future offering determined by a smart contract circuit, and the like. Further, a future offering may be a contingent future offer, or an offer based on conditions resulting on the offer being a future offering, such as where the future offer is contingent upon or with the conditions imposed by a predetermined condition (e.g., a security may be purchased for $1000 at a set future date contingent upon a predetermined state of a market indicator). Certain components may not be considered a future offering individually, but may be considered a future offering in an aggregated system—for example, an offer for a loan may not be considered a future offering if the offer is not authorized through a collective agreement amongst a plurality of parties related to the offer, but may be considered a future offer once a vote has been collected and stored through a distributed ledger, such as through a blockchain circuit. In certain embodiments, a future offering may be considered a future offering for some purposes but not for other purposes—for example, a future offering may be contingent upon a condition being met in the future, and so the future offering may not be considered a future offer until the condition is met. Additionally, in certain embodiments, otherwise similar looking systems may be differentiated in determining whether such systems are future offerings, and/or which type of future offerings. For example, two security offerings may be determined to be offerings to be made at a future time, however, one may have immediate contingences to be met and thus may not be considered to be a future offering but rather an immediate offering with future declarations. Accordingly, the benefits of the present disclosure may be applied in a wide variety of systems, and any such systems may be considered in association with a future offering herein, while in certain embodiments a given system may not be considered in association with a future offering herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is in association with a future offering and/or whether aspects of the present disclosure can benefit or enhance the contemplated system include, without limitation a forward offering, a contingent forward offering, a forward offing in a forward market platform (e.g., for creating a future offering or contingent future offering associated with identifying offering data from a platform-operated marketplace or external marketplace); a future offering with respect to entering into a smart contract (e.g., by executing an indication of a commitment to purchase, attend, or otherwise consume a future offering), and the like.

The term access right (and derivatives or variations) as utilized herein may be understood broadly to describe an entitlement to acquire or possess a property, article, or other thing of value. A contingent access right may be conditioned upon a trigger or condition being met before such an access right becomes entitled, vested or otherwise defensible. An access right or contingent access right may also serve specific purposes or be configured for different applications or contexts, such as, without limitation, loan-related actions or any service or offering. Without limitation, notices may be required to be provided to the owner of a property, article, or item of value before such access rights or contingent access rights are exercised. Access rights and contingent access rights in various forms may be included where discussing a legal action, a delinquent or defaulted loan or agreement, or other circumstances where a lender may be seeking remedy, without limitation. One of skill in the art, having the benefit of the disclosure herein and knowledge ordinarily available about a contemplated system, can readily determine the value of such rights implemented in an embodiment. While specific examples of access rights and contingent access rights are described herein for purposes of illustration, any embodiment benefitting from the disclosures herein, and any considerations understood to one of skill in the art having the benefit of the disclosures herein, are specifically contemplated within the scope of the present disclosure.

The term smart contract (and other forms or variations) as utilized herein may be understood broadly to describe a method, system, connected resource or wide area network offering one or more resources useful to assist or perform actions, tasks or things by embodiments disclosed herein. A smart contract may be a set of steps or a process to negotiate, administrate, restructure, or implement an agreement or loan between parties. A smart contract may also be implemented as an application, website, FTP site, server, appliance or other connected component or Internet related system that renders resources to negotiate, administrate, restructure, or implement an agreement or loan between parties. A smart contract may be a self-contained system, or may be part of a larger system or component that may also be a smart contract. For example, a smart contract may refer to a loan or an agreement itself, conditions or terms, or may refer to a system to implement such a loan or agreement. In certain embodiments, a smart contract circuit or robotic process automation system may incorporate or be incorporated into automatic robotic process automation system to perform one or more purposes or tasks, whether part of a loan or transaction process, or otherwise. One of skill in the art, having the benefit of the disclosure herein and knowledge ordinarily available about a contemplated system can readily determine the purposes and use of this term as it relates to a smart contract in various forms, embodiments and contexts disclosed herein.

The term allocation of reward (and variations) as utilized herein may be understood broadly to describe a thing or consideration allocated or provided as consideration, or provided for a purpose. The allocation of rewards can be of a financial type, or non-financial type, without limitation. A specific type of allocation of reward may also serve a number of different purposes or be configured for different applications or contexts, such as, without limitation: a reward event, claims for rewards, monetary rewards, rewards captured as a data set, rewards points, and other forms of rewards. Thus an allocation of rewards may be provided as a consideration within the context of a loan or agreement. Systems may be utilized to allocate rewards. The allocation of rewards in various forms may be included where discussing a particular behavior, or encouragement of a particular behavior, without limitation. An allocation of a reward may include an actual dispensation of the award, and/or a recordation of the reward. The allocation of rewards may be performed by a smart contract circuit or a robotic processing automation system. One of skill in the art, having the benefit of the disclosure herein and knowledge ordinarily available about a contemplated system, can readily determine the value of the allocation of rewards in an embodiment. While specific examples of the allocation of rewards are described herein for purposes of illustration, any embodiment benefitting from the disclosures herein, and any considerations understood to one of skill in the art having the benefit of the disclosures herein, are specifically contemplated within the scope of the present disclosure.

The term satisfaction of parameters or conditions (and other derivatives, forms, or variations) as utilized herein may be understood broadly to describe completion, presence or proof of parameters or conditions that have been met. The term generally may relate to a process of determining such satisfaction of parameters or conditions, or may relate to the completion of such a process with a result, without limitation. Satisfaction may result in a successful outcome of other triggers or conditions or terms that may come into execution, without limitation. Satisfaction of parameters or conditions may occur in many different contexts of contracts or loans, such as lending, refinancing, consolidation, factoring, brokering, foreclosure, and data processing (e.g., data collection), or combinations thereof, without limitation. Satisfaction of parameters or conditions may be used in the form of a noun (e.g., the satisfaction of the debt repayment), or may be used in a verb form to describe the process of determining a result to parameters or conditions. For example, a borrower may have satisfaction of parameters by making a certain number of payments on time, or may cause satisfaction of a condition allowing access rights to an owner if a loan defaults, without limitation. In certain embodiments, a smart contract or robotic process automation system may perform or determine satisfaction of parameters or conditions for one or more of the parties and process appropriate tasks for satisfaction of parameters or conditions. In some cases satisfaction of parameters or conditions by the smart contract or robotic process automation system may not complete or be successful, and depending upon such outcomes, this may enable automated action or trigger other conditions or terms. One of skill in the art, having the benefit of the disclosure herein and knowledge ordinarily available about a contemplated system can readily determine the purposes and use of this term in various forms, embodiments and contexts disclosed herein.

The term information (and other forms such as info or informational, without limitation) as utilized herein may be understood broadly in a variety of contexts with respect to an agreement or a loan. The term generally may relate to a large context, such as information regarding an agreement or loan, or may specifically relate to a finite piece of information (e.g., a specific detail of an event that happened on a specific date). Thus, information may occur in many different contexts of contracts or loans, and may be used in the contexts, without limitation of evidence, transactions, access, and the like. Or, without limitation, information may be used in conjunction with stages of an agreement or transaction, such as lending, refinancing, consolidation, factoring, brokering, foreclosure, and information processing (e.g., data or information collection), or combinations thereof. For example, information as evidence, transaction, access, etc. may be used in the form of a noun (e.g., the information was acquired from the borrower), or may refer as a noun to an assortment of informational items (e.g., the information about the loan may be found in the smart contract), or may be used in the form of characterizing as an adjective (e.g., the borrower was providing an information submission). For example, a lender may collect an overdue payment from a borrower through an online payment, or may have a successful collection of overdue payments acquired through a customer service telephone call. In certain embodiments, a smart contract circuit or robotic process automation system may perform collection, administration, calculating, providing, or other tasks for one or more of the parties and process appropriate tasks relating to information (e.g., providing notice of an overdue payment). In some cases information by the smart contract circuit or robotic process automation system may be incomplete, and depending upon such outcomes this may enable automated action or trigger other conditions or terms. One of skill in the art, having the benefit of the disclosure herein and knowledge ordinarily available about a contemplated system can readily determine the purposes and use of information as evidence, transaction, access, etc. in various forms, embodiments and contexts disclosed herein.

Information may be linked to external information (e.g., external sources). The term more specifically may relate to the acquisition, parsing, receiving, or other relation to an external origin or source, without limitation. Thus, information linked to external information or sources may be used in conjunction with stages of an agreement or transaction, such as lending, refinancing, consolidation, factoring, brokering, foreclosure, and information processing (e.g., data or information collection), or combinations thereof. For example, information linked to external information may change as the external information changes, such as a borrower's credit score, which is based on an external source. In certain embodiments, a smart contract circuit or robotic process automation system may perform acquisition, administration, calculating, receiving, updating, providing or other tasks for one or more of the parties and process appropriate tasks relating to information that is linked to external information. In some cases information that is linked to external information by the smart contract or robotic process automation system may be incomplete, and depending upon such outcomes this may enable automated action or trigger other conditions or terms. One of skill in the art, having the benefit of the disclosure herein and knowledge ordinarily available about a contemplated system can readily determine the purposes and use of this term in various forms, embodiments and contexts disclosed herein.

Information that is a part of a loan or agreement may be separated from information presented in an access location. The term more specifically may relate to the characterization that information can be apportioned, split, restricted, or otherwise separated from other information within the context of a loan or agreement. Thus, information presented or received on an access location may not necessarily be the whole information available for a given context. For example, information provided to a borrower may be different information received by a lender from an external source, and may be different than information received or presented from an access location. In certain embodiments, a smart contract circuit or robotic process automation system may perform separation of information or other tasks for one or more of the parties and process appropriate tasks. One of skill in the art, having the benefit of the disclosure herein and knowledge ordinarily available about a contemplated system, can readily determine the purposes and use of this term in various forms, embodiments and contexts disclosed herein.

The term encryption of information and control of access (and other related terms) as utilized herein may be understood broadly to describe generally whether a party or parties may observe or possess certain information, actions, events, or activities relating to a transaction or loan. Encryption of information may be utilized to prevent a party from accessing, observing, or receiving information, or may alternatively be used to prevent parties outside the transaction or loan from being able to access, observe or receive confidential (or other) information. Control of access to information relates to the determination of whether a party is entitled to such access of information. Encryption of information or control of access may occur in many different contexts of loans, such as lending, refinancing, consolidation, factoring, brokering, foreclosure, administration, negotiating, collecting, procuring, enforcing, and data processing (e.g., data collection), or combinations thereof, without limitation. An encryption of information or control of access to information may refer to a single instance, or may characterize a larger amount of information, actions, events, or activities, without limitation. For example, a borrower or lender may have access to information about a loan, but other parties outside the loan or agreement may not be able to access the loan information due to encryption of the information, or a control of access to the loan details. In certain embodiments, a smart contract circuit or robotic process automation system may perform encryption of information or control of access to information for one or more of the parties and process appropriate tasks for encryption or control of access of information. One of skill in the art, having the benefit of the disclosure herein and knowledge ordinarily available about a contemplated system can readily determine the purposes and use of this term in various forms, embodiments and contexts disclosed herein.

The term potential access party list (and other related terms) as utilized herein may be understood broadly to describe generally whether a party or parties may observe or possess certain information, actions, events, or activities relating to a transaction or loan. A potential access party list may be utilized to authorize one or more parties to access, observe or receive information, or may alternatively be used to prevent parties from being able to do so. A potential access party list information relates to the determination of whether a party (either on the potential access party list or not on the list) is entitled to such access of information. A potential access party list may occur in many different contexts of loans, such as lending, refinancing, consolidation, factoring, brokering, foreclosure, administration, negotiating, collecting, procuring, enforcing and data processing (e.g., data collection), or combinations thereof, without limitation. A potential access party list may refer to a single instance, or may characterize a larger amount of parties or information, actions, events, or activities, without limitation. For example, a potential access party list may grant (or deny) access to information about a loan, but other parties outside potential access party list may not be able to (or may be granted) access the loan information. In certain embodiments, a smart contract circuit or robotic process automation system may perform administration or enforcement of a potential access party list for one or more of the parties and process appropriate tasks for encryption or control of access of information. One of skill in the art, having the benefit of the disclosure herein and knowledge ordinarily available about a contemplated system can readily determine the purposes and use of this term in various forms, embodiments and contexts disclosed herein.

The term offering, making an offer, and similar terms as utilized herein should be understood broadly. Without limitation to any other aspect or description of the present disclosure, an offering includes any offer of an item or service including, without limitation, an insurance offering, a security offering, an offer to provide an item or service, an offer with respect to a proposed purchase, an offering made through a forward market platform, a future offering, a contingent offering, offers related to lending (e.g., lending, refinancing, collection, consolidation, factoring, brokering, foreclosure), an offering determined by a smart contract circuit, an offer directed to a customer/debtor, an offering directed to a provider/lender, a 3rd party offer (e.g., regulator, auditor, partial owner, tiered provider) and the like. Offerings may include physical goods, virtual goods, software, physical services, access rights, entertainment content, accommodations, or many other items, services, solutions, or considerations. In an example, a third party offer may be to schedule a band instead of just an offer of tickets for sale. Further, an offer may be based on pre-determined conditions or contingencies. Certain components may not be considered an offering individually, but may be considered an offering in an aggregated system—for example, an offer for insurance may not be considered an offering if the offer is not approved by one or more parties related to the offer, however once approval has been granted, it may be considered an offer. Accordingly, the benefits of the present disclosure may be applied in a wide variety of systems, and any such systems may be considered in association with an offering herein, while in certain embodiments a given system may not be considered in association with an offering herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is in association with an offering and/or whether aspects of the present disclosure can benefit or enhance the contemplated system include, without limitation the item or service being offered, a contingency related to the offer, a way of tracking if a contingency or condition has been met, an approval of the offering, an execution of an exchange of consideration for the offering, and the like.

The term artificial intelligence (AI) solution should be understood broadly. Without limitation to any other aspect of the present disclosure, an AI solution includes a coordinated group of AI related aspects to perform one or more tasks or operations as set forth throughout the present disclosure. An example AI solution includes one or more AI components, including any AI components set forth herein, including at least a neural network, an expert system, and/or a machine learning component. The example AI solution may include as an aspect the types of components of the solution, such as a heuristic AI component, a model based AI component, a neural network of a selected type (e.g., recursive, convolutional, perceptron, etc.), and/or an AI component of any type having a selected processing capability (e.g., signal processing, frequency component analysis, auditory processing, visual processing, speech processing, text recognition, etc.). Without limitation to any other aspect of the present disclosure, a given AI solution may be formed from the number and type of AI components of the AI solution, the connectivity of the AI components (e.g., to each other, to inputs from a system including or interacting with the AI solution, and/or to outputs to the system including or interacting with the AI solution). The given AI solution may additionally be formed from the connection of the AI components to each other within the AI solution, and to boundary elements (e.g., inputs, outputs, stored intermediary data, etc.) in communication with the AI solution. The given AI solution may additionally be formed from a configuration of each of the AI components of the AI solution, where the configuration may include aspects such as: model calibrations for an AI component; connectivity and/or flow between AI components (e.g., serial and/or parallel coupling, feedback loops, logic junctions, etc.); the number, selected input data, and/or input data processing of inputs to an AI component; a depth and/or complexity of a neural network or other components; a training data description of an AI component (e.g., training data parameters such as content, amount of training data, statistical description of valid training data, etc.); and/or a selection and/or hybrid description of a type for an AI component. An AI solution includes a selection of AI elements, flow connectivity of those AI elements, and/or configuration of those AI elements.

One of skill in the art, having the benefit of the present disclosure, can readily determine an AI solution for a given system, and/or configure operations to perform a selection and/or configuration operation for an AI solution for a given system. Certain considerations to determining an AI solution, and/or configuring operations to perform a selection and/or configuration operation for an AI solution include, without limitation: an availability of AI components and/or component types for a given implementation; an availability of supporting infrastructure to implement given AI components (e.g., data input values available, including data quality, level of service, resolution, sampling rate, etc.; availability of suitable training data for a given AI solution; availability of expert inputs, such as for an expert system and/or to develop a model training data set; regulatory and/or policy based considerations including permitted action by the AI solution, requirements for acquisition and/or retention of sensitive data, difficult to obtain data, and/or expensive data); operational considerations for a system including or interacting with the AI solution, including response time specifications, safety considerations, liability considerations, etc.; available computing resources such as processing capability, network communication capability, and/or memory storage capability (e.g., to support initial data, training data, input data such as cached, buffered, or stored input data, iterative improvement state data, output data such as cached, buffered, or stored output data, and/or intermediate data storage, such as data to support ongoing calculations, historical data, and/or accumulation data); the types of tasks to be performed by the AI solution, and the suitability of AI components for those tasks, sensitivity of AI components performing the tasks (e.g., variability of the output space relative to a disturbance size of the input space); the interactions of AI components within the entire AI solution (e.g., a low capability rationality AI component may be coupled with a higher capability AI component that may provide high sensitivity and/or unbounded response to inputs); and/or model implementation considerations (e.g., requirements to re-calibrate, aging constraints of a model, etc.).

A selected and/or configured AI solution may be utilized with any of the systems, procedures, and/or aspects of embodiments as set forth throughout the present disclosure. For example, a system utilizing an expert system may include the expert system as all or a part of a selected, configured AI solution. In another example, a system utilizing a neural network, and/or a combination of neural networks, may include the neural network(s) as all or a part of a selected, configured AI solution. The described aspects of an AI solution, including the selection and configuration of the AI solution, are non-limiting illustrations.

Transaction Platform

Figure 1:
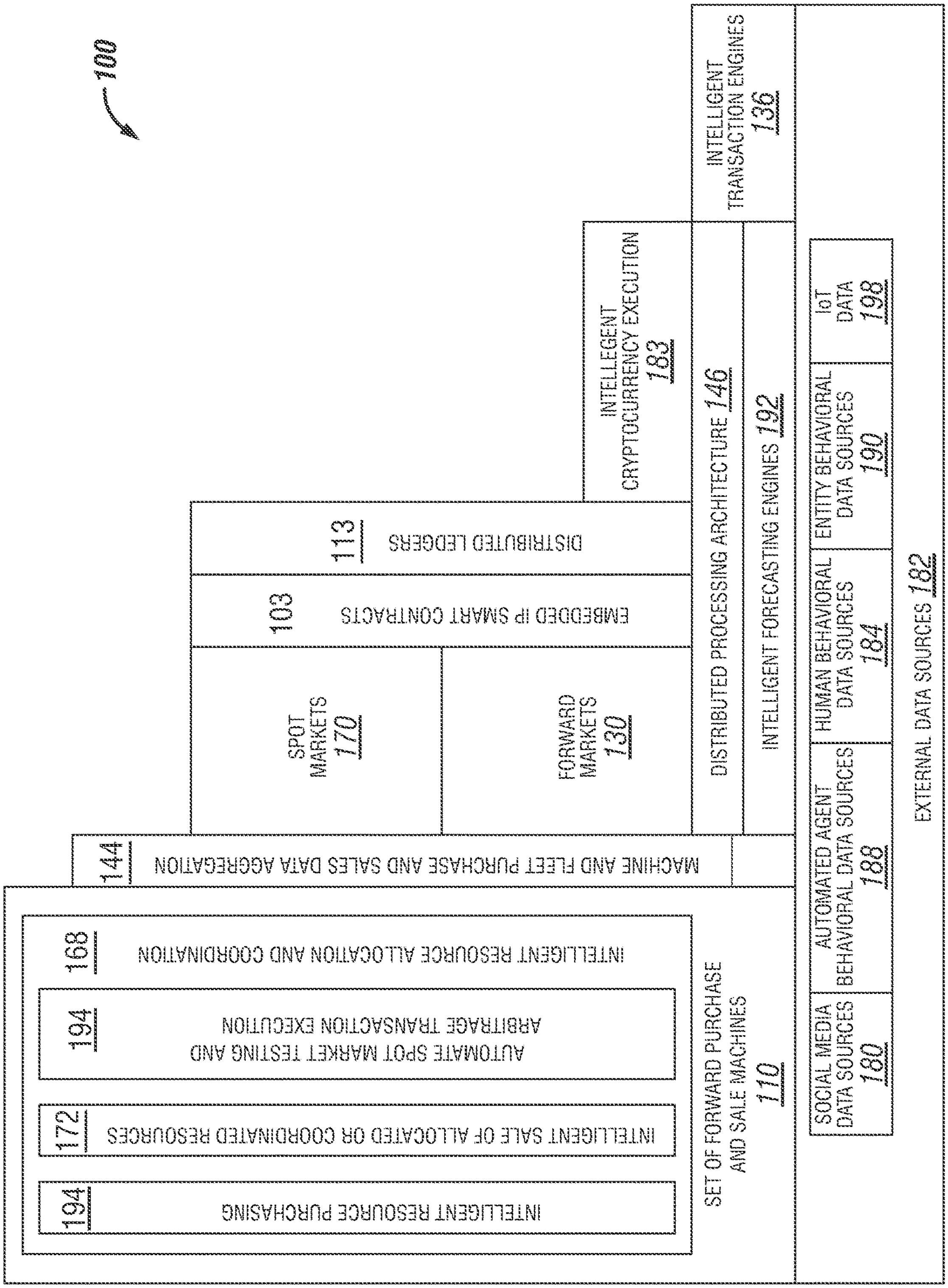
FIG. 1 is a schematic diagram of components of a platform for enabling intelligent transactions in accordance with embodiments of the present disclosure.
Figure 2A:
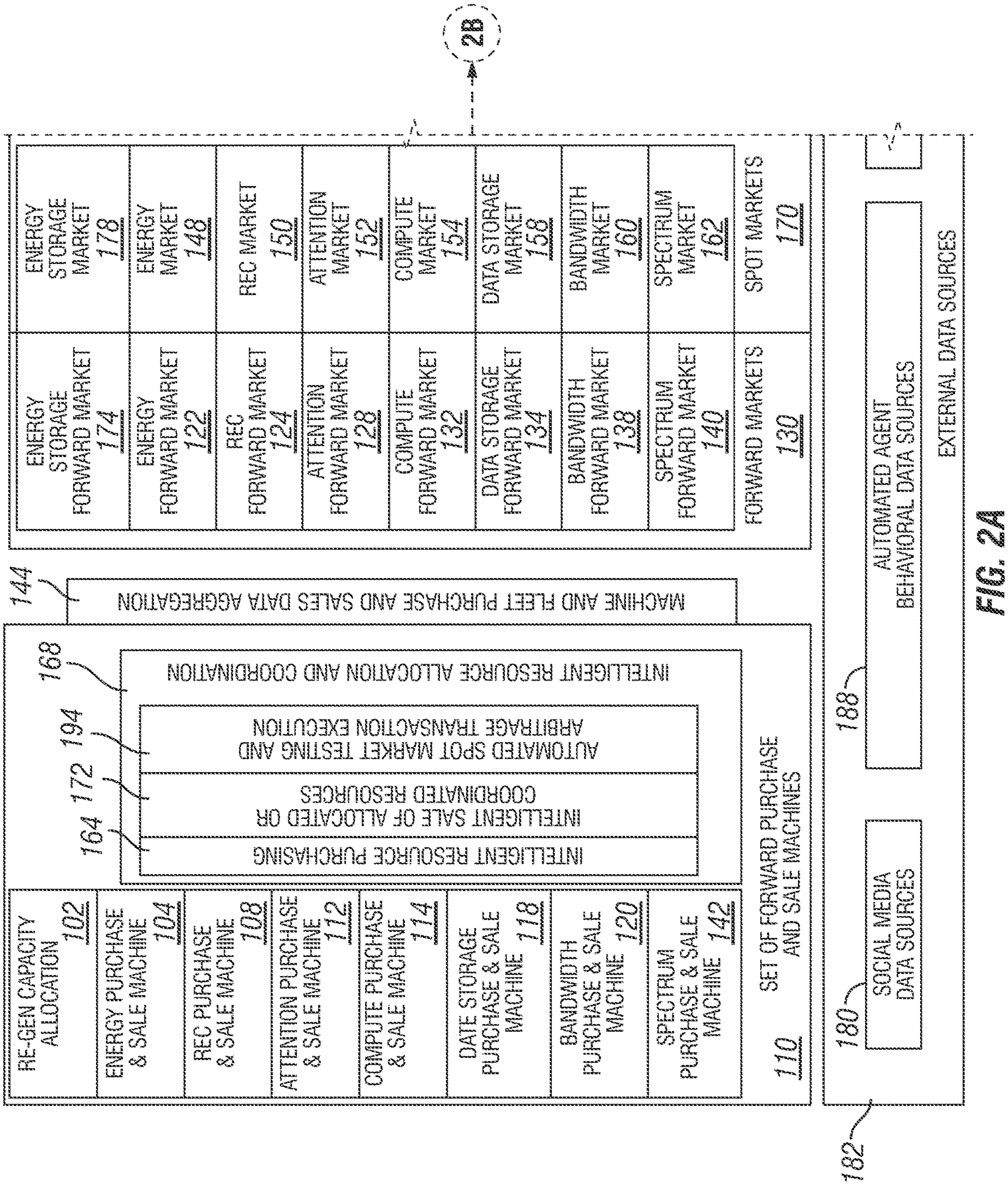
FIGS. 2A and 2B are schematic diagrams of additional components of a platform for enabling intelligent transactions in accordance with embodiments of the present disclosure.
Figure 2B:
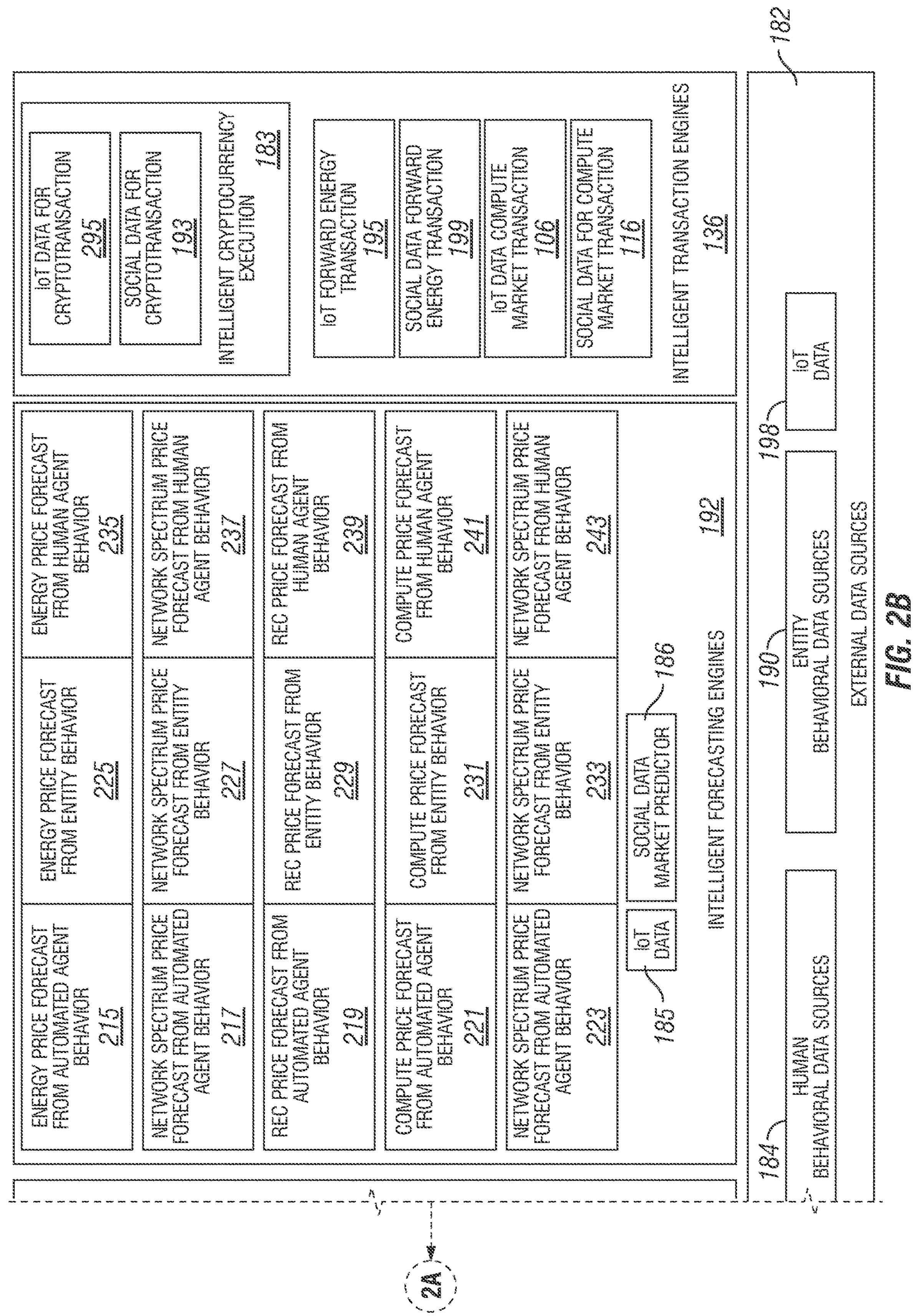

Referring to FIGS. 1, 2A and 2B, a set of systems, methods, components, modules, machines, articles, blocks, circuits, services, programs, applications, hardware, software and other elements are provided, collectively referred to herein interchangeably as the system 100 or the platform 100, The platform 100 enables a wide range of improvements of and for various machines, systems, and other components that enable transactions involving the exchange of value (such as using currency, cryptocurrency, tokens, rewards or the like, as well as a wide range of in-kind and other resources) in various markets, including current or spot markets 170, forward markets 130 and the like, for various goods, services, and resources. As used herein, "currency" should be understood to encompass fiat currency issued or regulated by governments, cryptocurrencies, tokens of value, tickets, loyalty points, rewards points, coupons, and other elements that represent or may be exchanged for value. Resources, such as ones that may be exchanged for value in a marketplace, should be understood to encompass goods, services, natural resources, energy resources, computing resources, energy storage resources, data storage resources, network bandwidth resources, processing resources and the like, including resources for which value is exchanged and resources that enable a transaction to occur (such as necessary computing and processing resources, storage resources, network resources, and energy resources that enable a transaction). The platform 100 may include a set of forward purchase and sale machines 110, each of which may be configured as an expert system or automated intelligent agent for interaction with one or more of the set of spot markets 170 and forward markets 130. Enabling the set of forward purchase and sale machines 110 are an intelligent resource purchasing system 164 having a set of intelligent agents for purchasing resources in spot and forward markets; an intelligent resource allocation and coordination system 168 for the intelligent sale of allocated or coordinated resources, such as compute resources, energy resources, and other resources involved in or enabling a transaction; an intelligent sale engine 172 for intelligent coordination of a sale of allocated resources in spot and futures markets; and an automated spot market testing and arbitrage transaction execution engine 194 for performing spot testing of spot and forward markets, such as with micro-transactions and, where conditions indicate favorable arbitrage conditions, automatically executing transactions in resources that take advantage of the favorable conditions. Each of the engines may use model-based or rule-based expert systems, such as based on rules or heuristics, as well as deep learning systems by which rules or heuristics may be learned over trials involving a large set of inputs. The engines may use any of the expert systems and artificial intelligence capabilities described throughout this disclosure. Interactions within the platform 100, including of all platform components, and of interactions among them and with various markets, may be tracked and collected, such as by a data aggregation system 144, such as for aggregating data on purchases and sales in various marketplaces by the set of machines described herein. Aggregated data may include tracking and outcome data that may be fed to artificial intelligence and machine learning systems, such as to train or supervise the same. The various engines may operate on a range of data sources, including aggregated data from marketplace transactions, tracking data regarding the behavior of each of the engines, and a set of external data sources 182, which may include social media data sources 180 (such as social networking sites like Facebook™ and Twitter™), Internet of Things (IoT) data sources (including from sensors, cameras, data collectors, and instrumented machines and systems), such as IoT sources that provide information about machines and systems that enable transactions and machines and systems that are involved in production and consumption of resources. External data sources 182 may include behavioral data sources, such as automated agent behavioral data sources 188 (such as tracking and reporting on behavior of automated agents that are used for conversation and dialog management, agents used for control functions for machines and systems, agents used for purchasing and sales, agents used for data collection, agents used for advertising, and others), human behavioral data sources (such as data sources tracking online behavior, mobility behavior, energy consumption behavior, energy production behavior, network utilization behavior, compute and processing behavior, resource consumption behavior, resource production behavior, purchasing behavior, attention behavior, social behavior, and others), and entity behavioral data sources 190 (such as behavior of business organizations and other entities, such as purchasing behavior, consumption behavior, production behavior, market activity, merger and acquisition behavior, transaction behavior, location behavior, and others). The IoT, social and behavioral data from and about sensors, machines, humans, entities, and automated agents may collectively be used to populate expert systems, machine learning systems, and other intelligent systems and engines described throughout this disclosure, such as being provided as inputs to deep learning systems and being provided as feedback or outcomes for purposes of training, supervision, and iterative improvement of systems for prediction, forecasting, classification, automation and control. The data may be organized as a stream of events. The data may be stored in a distributed ledger or other distributed system. The data may be stored in a knowledge graph where nodes represent entities and links represent relationships. The external data sources may be queried via various database query functions. The external data sources 182 may be accessed via APIs, brokers, connectors, protocols like REST and SOAP, and other data ingestion and extraction techniques. Data may be enriched with metadata and may be subject to transformation and loading into suitable forms for consumption by the engines, such as by cleansing, normalization, de-duplication, and the like.

The platform 100 may include a set of intelligent forecasting engines 192 for forecasting events, activities, variables, and parameters of spot markets 170, forward markets 130, resources that are traded in such markets, resources that enable such markets, behaviors (such as any of those tracked in the external data sources 182), transactions, and the like. The intelligent forecasting engines 192 may operate on data from the data aggregation systems 144 about elements of the platform 100 and on data from the external data sources 182. The platform may include a set of intelligent transaction engines 136 for automatically executing transactions in spot markets 170 and forward markets 130. This may include executing intelligent cryptocurrency transactions with an intelligent cryptocurrency execution engine 183 as described in more detail below. The platform 100 may make use of asset of improved distributed ledgers 113 and improved smart contracts 103, including ones that embed and operate on proprietary information, instruction sets and the like that enable complex transactions to occur among individuals with reduced (or without) reliance on intermediaries. These and other components are described in more detail throughout this disclosure.

Referring to the block diagrams of FIGS. 2A and 2B, further details and additional components of the platform 100 and interactions among them are depicted. The set of forward purchase and sale machines 110 may include a regeneration capacity allocation engine 102 (such as for allocating energy generation or regeneration capacity, such as within a hybrid vehicle or system that includes energy generation or regeneration capacity, a renewable energy system that has energy storage, or other energy storage system, where energy is allocated for one or more of sale on a forward market 130, sale in a spot market 170, use in completing a transaction (e.g., mining for cryptocurrency), or other purposes. For example, the regeneration capacity allocation engine 102 may explore available options for use of stored energy, such as sale in current and forward energy markets that accept energy from producers, keeping the energy in storage for future use, or using the energy for work (which may include processing work, such as processing activities of the platform like data collection or processing, or processing work for executing transactions, including mining activities for cryptocurrencies).

The set of forward purchase and sale machines 110 may include an energy purchase and sale machine 104 for purchasing or selling energy, such as in an energy spot market 148 or an energy forward market 122. The energy purchase and sale machine 104 may use an expert system, neural network or other intelligence to determine timing of purchases, such as based on current and anticipated state information with respect to pricing and availability of energy and based on current and anticipated state information with respect to needs for energy, including needs for energy to perform computing tasks, cryptocurrency mining, data collection actions, and other work, such as work done by automated agents and systems and work required for humans or entities based on their behavior. For example, the energy purchase machine may recognize, by machine learning, that a business is likely to require a block of energy in order to perform an increased level of manufacturing based on an increase in orders or market demand and may purchase the energy at a favorable price on a futures market, based on a combination of energy market data and entity behavioral data. Continuing the example, market demand may be understood by machine learning, such as by processing human behavioral data sources 184, such as social media posts, e-commerce data and the like that indicate increasing demand. The energy purchase and sale machine 104 may sell energy in the energy spot market 148 or the energy forward market 122. Sale may also be conducted by an expert system operating on the various data sources described herein, including with training on outcomes and human supervision.

The set of forward purchase and sale machines 110 may include a renewable energy credit (REC) purchase and sale machine 108, which may purchase renewable energy credits, pollution credits, and other environmental or regulatory credits in a spot market 150 or forward market 124 for such credits. Purchasing may be configured and managed by an expert system operating on any of the external data sources 182 or on data aggregated by the set of data aggregation systems 144 for the platform. Renewable energy credits and other credits may be purchased by an automated system using an expert system, including machine learning or other artificial intelligence, such as where credits are purchased with favorable timing based on an understanding of supply and demand that is determined by processing inputs from the data sources. The expert system may be trained on a data set of outcomes from purchases under historical input conditions. The expert system may be trained on a data set of human purchase decisions and/or may be supervised by one or more human operators. The renewable energy credit (REC) purchase and sale machine 108 may also sell renewable energy credits, pollution credits, and other environmental or regulatory credits in a spot market 150 or forward market 124 for such credits. Sale may also be conducted by an expert system operating on the various data sources described herein, including with training on outcomes and human supervision.

The set of forward purchase and sale machines 110 may include an attention purchase and sale machine 112, which may purchase one or more attention-related resources, such as advertising space, search listing, keyword listing, banner advertisements, participation in a panel or survey activity, participation in a trial or pilot, or the like in a spot market for attention 152 or a forward market for attention 128. Attention resources may include the attention of automated agents, such as bots, crawlers, dialog managers, and the like that are used for searching, shopping, and purchasing. Purchasing of attention resources may be configured and managed by an expert system operating on any of the external data sources 182 or on data aggregated by the set of data aggregation systems 144 for the platform. Attention resources may be purchased by an automated system using an expert system, including machine learning or other artificial intelligence, such as where resources are purchased with favorable timing, such as based on an understanding of supply and demand, that is determined by processing inputs from the various data sources. For example, the attention purchase and sale machine 112 may purchase advertising space in a forward market for advertising based on learning from a wide range of inputs about market conditions, behavior data, and data regarding activities of agent and systems within the platform 100. The expert system may be trained on a data set of outcomes from purchases under historical input conditions. The expert system may be trained on a data set of human purchase decisions and/or may be supervised by one or more human operators. The attention purchase and sale machine 112 may also sell one or more attention-related resources, such as advertising space, search listing, keyword listing, banner advertisements, participation in a panel or survey activity, participation in a trial or pilot, or the like in a spot market for attention 152 or a forward market for attention 128, which may include offering or selling access to, or attention or, one or more automated agents of the platform 100. Sale may also be conducted by an expert system operating on the various data sources described herein, including with training on outcomes and human supervision.

The set of forward purchase and sale machines 110 may include a compute purchase and sale machine 114, which may purchase one or more computation-related resources, such as processing resources, database resources, computation resources, server resources, disk resources, input/output resources, temporary storage resources, memory resources, virtual machine resources, container resources, and others in a spot market for compute 154 or a forward market for compute 132. Purchasing of compute resources may be configured and managed by an expert system operating on any of the external data sources 182 or on data aggregated by the set of data aggregation systems 144 for the platform. Compute resources may be purchased by an automated system using an expert system, including machine learning or other artificial intelligence, such as where resources are purchased with favorable timing, such as based on an understanding of supply and demand, that is determined by processing inputs from the various data sources. For example, the compute purchase and sale machine 114 may purchase or reserve compute resources on a cloud platform in a forward market for compute resources based on learning from a wide range of inputs about market conditions, behavior data, and data regarding activities of agent and systems within the platform 100, such as to obtain such resources at favorable prices during surge periods of demand for computing. The expert system may be trained on a data set of outcomes from purchases under historical input conditions. The expert system may be trained on a data set of human purchase decisions and/or may be supervised by one or more human operators. The compute purchase and sale machine 114 may also sell one or more computation-related resources that are connected to, part of, or managed by the platform 100, such as processing resources, database resources, computation resources, server resources, disk resources, input/output resources, temporary storage resources, memory resources, virtual machine resources, container resources, and others in a spot market for compute 154 or a forward market for compute 132. Sale may also be conducted by an expert system operating on the various data sources described herein, including with training on outcomes and human supervision.

The set of forward purchase and sale machines 110 may include a data storage purchase and sale machine 118, which may purchase one or more data-related resources, such as database resources, disk resources, server resources, memory resources, RAM resources, network attached storage resources, storage attached network (SAN) resources, tape resources, time-based data access resources, virtual machine resources, container resources, and others in a spot market for storage resources 158 or a forward market for data storage 134. Purchasing of data storage resources may be configured and managed by an expert system operating on any of the external data sources 182 or on data aggregated by the set of data aggregation systems 144 for the platform. Data storage resources may be purchased by an automated system using an expert system, including machine learning or other artificial intelligence, such as where resources are purchased with favorable timing, such as based on an understanding of supply and demand, that is determined by processing inputs from the various data sources. For example, the compute purchase and sale machine 114 may purchase or reserve compute resources on a cloud platform in a forward market for compute resources based on learning from a wide range of inputs about market conditions, behavior data, and data regarding activities of agent and systems within the platform 100, such as to obtain such resources at favorable prices during surge periods of demand for storage. The expert system may be trained on a data set of outcomes from purchases under historical input conditions. The expert system may be trained on a data set of human purchase decisions and/or may be supervised by one or more human operators. The data storage purchase and sale machine 118 may also sell one or more data storage-related resources that are connected to, part of, or managed by the platform 100 in a spot market for storage resources 158 or a forward market for data storage 134. Sale may also be conducted by an expert system operating on the various data sources described herein, including with training on outcomes and human supervision.

The set of forward purchase and sale machines 110 may include a bandwidth purchase and sale machine 120, which may purchase one or more bandwidth-related resources, such as cellular bandwidth, Wi-Fi bandwidth, radio bandwidth, access point bandwidth, beacon bandwidth, local area network bandwidth, wide area network bandwidth, enterprise network bandwidth, server bandwidth, storage input/output bandwidth, advertising network bandwidth, market bandwidth, or other bandwidth, in a spot market for bandwidth resources 160 or a forward market for bandwidth 138. Purchasing of bandwidth resources may be configured and managed by an expert system operating on any of the external data sources 182 or on data aggregated by the set of data aggregation systems 144 for the platform. Bandwidth resources may be purchased by an automated system using an expert system, including machine learning or other artificial intelligence, such as where resources are purchased with favorable timing, such as based on an understanding of supply and demand, that is determined by processing inputs from the various data sources. For example, the bandwidth purchase and sale machine 120 may purchase or reserve bandwidth on a network resource for a future networking activity managed by the platform based on learning from a wide range of inputs about market conditions, behavior data, and data regarding activities of agent and systems within the platform 100, such as to obtain such resources at favorable prices during surge periods of demand for bandwidth. The expert system may be trained on a data set of outcomes from purchases under historical input conditions. The expert system may be trained on a data set of human purchase decisions and/or may be supervised by one or more human operators. The bandwidth purchase and sale machine 120 may also sell one or more bandwidth-related resources that are connected to, part of, or managed by the platform 100 in a spot market for bandwidth resources 160 or a forward market for bandwidth 138. Sale may also be conducted by an expert system operating on the various data sources described herein, including with training on outcomes and human supervision.

The set of forward purchase and sale machines 110 may include a spectrum purchase and sale machine 142, which may purchase one or more spectrum-related resources, such as cellular spectrum, 3G spectrum, 4G spectrum, LTE spectrum, 5G spectrum, cognitive radio spectrum, peer-to-peer network spectrum, emergency responder spectrum and the like in a spot market for spectrum resources 162 or a forward market for spectrum/bandwidth 140. Purchasing of spectrum resources may be configured and managed by an expert system operating on any of the external data sources 182 or on data aggregated by the set of data aggregation systems 144 for the platform. Spectrum resources may be purchased by an automated system using an expert system, including machine learning or other artificial intelligence, such as where resources are purchased with favorable timing, such as based on an understanding of supply and demand, that is determined by processing inputs from the various data sources. For example, the spectrum purchase and sale machine 142 may purchase or reserve spectrum on a network resource for a future networking activity managed by the platform based on learning from a wide range of inputs about market conditions, behavior data, and data regarding activities of agent and systems within the platform 100, such as to obtain such resources at favorable prices during surge periods of demand for spectrum. The expert system may be trained on a data set of outcomes from purchases under historical input conditions. The expert system may be trained on a data set of human purchase decisions and/or may be supervised by one or more human operators. The spectrum purchase and sale machine 142 may also sell one or more spectrum-related resources that are connected to, part of, or managed by the platform 100 in a spot market for spectrum resources 162 or a forward market for spectrum/bandwidth 140. Sale may also be conducted by an expert system operating on the various data sources described herein, including with training on outcomes and human supervision.

In embodiments, the intelligent resource allocation and coordination system 168, including the intelligent resource purchasing system 164, the intelligent sale engine 172 and the automated spot market testing and arbitrage transaction execution engine 194, may provide coordinated and automated allocation of resources and coordinated execution of transactions across the various forward markets 130 and spot markets 170 by coordinating the various purchase and sale machines, such as by an expert system, such as a machine learning system (which may model-based or a deep learning system, and which may be trained on outcomes and/or supervised by humans). For example, the intelligent resource allocation and coordination system 168 may coordinate purchasing of resources for a set of assets and coordinated sale of resources available from a set of assets, such as a fleet of vehicles, a data center of processing and data storage resources, an information technology network (on premises, cloud, or hybrids), a fleet of energy production systems (renewable or non-renewable), a smart home or building (including appliances, machines, infrastructure components and systems, and the like thereof that consume or produce resources), and the like. The platform 100 may optimize allocation of resource purchasing, sale and utilization based on data aggregated in the platform, such as by tracking activities of various engines and agents, as well as by taking inputs from external data sources 182. In embodiments, outcomes may be provided as feedback for training the intelligent resource allocation and coordination system 168, such as outcomes based on yield, profitability, optimization of resources, optimization of business objectives, satisfaction of goals, satisfaction of users or operators, or the like. For example, as the energy for computational tasks becomes a significant fraction of an enterprise's energy usage, the platform 100 may learn to optimize how a set of machines that have energy storage capacity allocate that capacity among computing tasks (such as for cryptocurrency mining, application of neural networks, computation on data and the like), other useful tasks (that may yield profits or other benefits), storage for future use, or sale to the provider of an energy grid. The platform 100 may be used by fleet operators, enterprises, governments, municipalities, military units, first responder units, manufacturers, energy producers, cloud platform providers, and other enterprises and operators that own or operate resources that consume or provide energy, computation, data storage, bandwidth, or spectrum. The platform 100 may also be used in connection with markets for attention, such as to use available capacity of resources to support attention-based exchanges of value, such as in advertising markets, micro-transaction markets, and others.

Referring still to FIGS. 2A and 2B, the platform 100 may include a set of intelligent forecasting engines 192 that forecast one or more attributes, parameters, variables, or other factors, such as for use as inputs by the set of forward purchase and sale machines, the intelligent transaction engines 126 (such as for intelligent cryptocurrency execution) or for other purposes. Each of the set of intelligent forecasting engines 192 may use data that is tracked, aggregated, processed, or handled within the platform 100, such as by the data aggregation system 144, as well as input data from external data sources 182, such as social media data sources 180, automated agent behavioral data sources 188, human behavioral data sources 184, entity behavioral data sources 190 and IoT data sources 198. These collective inputs may be used to forecast attributes, such as using a model (e.g., Bayesian, regression, or other statistical model), a rule, or an expert system, such as a machine learning system that has one or more classifiers, pattern recognizers, and predictors, such as any of the expert systems described throughout this disclosure. In embodiments, the set of intelligent forecasting engines 192 may include one or more specialized engines that forecast market attributes, such as capacity, demand, supply, and prices, using particular data sources for particular markets. These may include an energy price forecasting engine 215 that bases its forecast on behavior of an automated agent, a network spectrum price forecasting engine 217 that bases its forecast on behavior of an automated agent, a REC price forecasting engine 219 that bases its forecast on behavior of an automated agent, a compute price forecasting engine 221 that bases its forecast on behavior of an automated agent, a network spectrum price forecasting engine 223 that bases its forecast on behavior of an automated agent. In each case, observations regarding the behavior of automated agents, such as ones used for conversation, for dialog management, for managing electronic commerce, for managing advertising and others may be provided as inputs for forecasting to the engines. The intelligent forecasting engines 192 may also include a range of engines that provide forecasts at least in part based on entity behavior, such as behavior of business and other organizations, such as marketing behavior, sales behavior, product offering behavior, advertising behavior, purchasing behavior, transactional behavior, merger and acquisition behavior, and other entity behavior. These may include an energy price forecasting engine 225 using entity behavior, a network spectrum price forecasting engine 227 using entity behavior, a REC price forecasting engine 229 using entity behavior, a compute price forecasting engine 231 using entity behavior, and a network spectrum price forecasting engine 233 using entity behavior.

The intelligent forecasting engines 192 may also include a range of engines that provide forecasts at least in part based on human behavior, such as behavior of consumers and users, such as purchasing behavior, shopping behavior, sales behavior, product interaction behavior, energy utilization behavior, mobility behavior, activity level behavior, activity type behavior, transactional behavior, and other human behavior. These may include an energy price forecasting engine 235 using human behavior, a network spectrum price forecasting engine 237 using human behavior, a REC price forecasting engine 239 using human behavior, a compute price forecasting engine 241 using human behavior, and a network spectrum price forecasting engine 243 using human behavior.

Referring still to FIGS. 2A and 2B, the platform 100 may include a set of intelligent transaction engines 136 that automate execution of transactions in forward markets 130 and/or spot markets 170 based on determination that favorable conditions exist, such as by the intelligent resource allocation and coordination system 168 and/or with use of forecasts form the intelligent forecasting engines 192. The intelligent transaction engines 136 may be configured to automatically execute transactions, using available market interfaces, such as APIs, connectors, ports, network interfaces, and the like, in each of the markets noted above. In embodiments, the intelligent transaction engines may execute transactions based on event streams that come from external data sources, such as IoT data sources 198 and social media data sources 180. The engines may include, for example, an IoT forward energy transaction engine 195 and/or an IoT compute market transaction engine 106, either or both of which may use data from the Internet of Things to determine timing and other attributes for market transaction in a market for one or more of the resources described herein, such as an energy market transaction, a compute resource transaction or other resource transaction. IoT data may include instrumentation and controls data for one or more machines (optionally coordinated as a fleet) that use or produce energy or that use or have compute resources, weather data that influences energy prices or consumption (such as wind data influencing production of wind energy), sensor data from energy production environments, sensor data from points of use for energy or compute resources (such as vehicle traffic data, network traffic data, IT network utilization data, Internet utilization and traffic data, camera data from work sites, smart building data, smart home data, and the like), and other data collected by or transferred within the Internet of Things, including data stored in IoT platforms and of cloud services providers like Amazon, IBM, and others. The intelligent transaction engines 136 may include engines that use social data to determine timing of other attributes for a market transaction in one or more of the resources described herein, such as a social data forward energy transaction engine 199 and/or a social data compute market transaction engine 116. Social data may include data from social networking sites (e.g., Facebook™, YouTube™, Twitter™, Snapchat™, Instagram™, and others), data from websites, data from e-commerce sites, and data from other sites that contain information that may be relevant to determining or forecasting behavior of users or entities, such as data indicating interest or attention to particular topics, goods or services, data indicating activity types and levels such as may be observed by machine processing of image data showing individuals engaged in activities, including travel, work activities, leisure activities, and the like. Social data may be supplied to machine learning, such as for learning user behavior or entity behavior, and/or as an input to an expert system, a model, or the like, such as one for determining, based on the social data, the parameters for a transaction. For example, an event or set of events in a social data stream may indicate the likelihood of a surge of interest in an online resource, a product, or a service, and compute resources, bandwidth, storage, or like may be purchased in advance (avoiding surge pricing) to accommodate the increased interest reflected by the social data stream.

Figure 3:
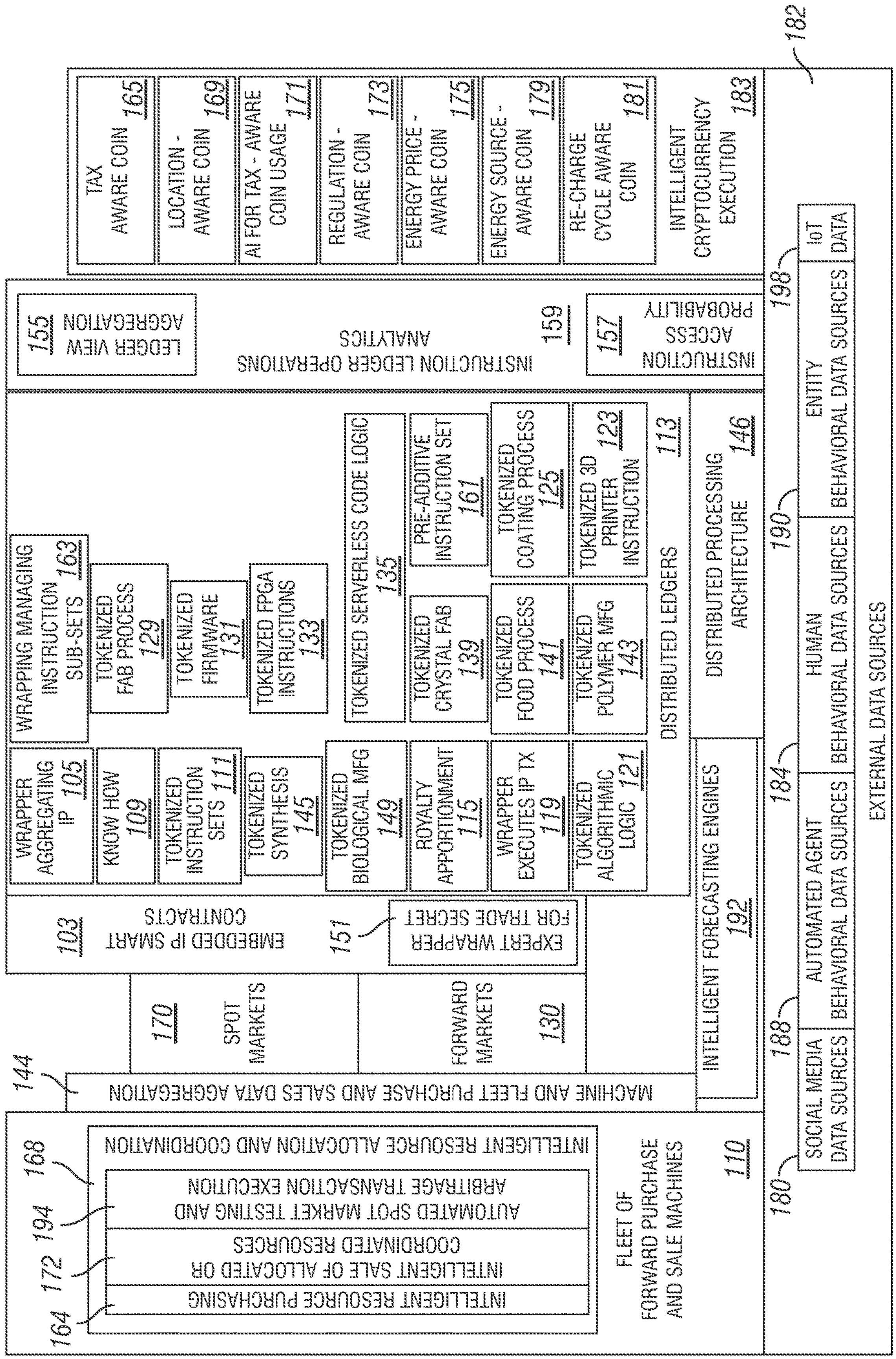
FIG. 3 is a schematic diagram of additional components of a platform for enabling intelligent transactions in accordance with embodiments of the present disclosure.

Referring to FIG. 3, the platform 100 may include capabilities for transaction execution that involve one or more distributed ledgers 113 and one or more smart contracts 103, where the distributed ledgers 113 and smart contracts 103 are configured to enable specialized transaction features for specific transaction domains. One such domain is intellectual property, which transactions are highly complex, involving licensing terms and conditions that are somewhat difficult to manage, as compared to more straightforward sales of goods or services. In embodiments, a smart contract wrapper 105, such as wrapper aggregating intellectual property, is provided, using a distributed ledger, wherein the smart contract embeds IP licensing terms for intellectual property that is embedded in the distributed ledger and wherein executing an operation on the distributed ledger provides access to the intellectual property and commits the executing party to the IP licensing terms. Licensing terms for a wide range of goods and services, including digital goods like video, audio, video game, video game element, music, electronic book, and other digital goods may be managed by tracking transactions involving them on a distributed ledger, whereby publishers may verify a chain of licensing and sublicensing. The distributed ledger may be configured to add each licensee to the ledger, and the ledger may be retrieved at the point of use of a digital item, such as in a streaming platform, to validate that licensing has occurred.

In embodiments, an improved distributed ledger is provided with the smart contract wrapper 105, such as an IP wrapper, container, smart contract, or similar mechanism for aggregating intellectual property licensing terms, wherein a smart contract wrapper on the distributed ledger allows an operation on the ledger to add intellectual property to an aggregate stack of intellectual property. In many cases, intellectual property builds on other intellectual property, such as where software code is derived from other code, where trade secrets or know-how for elements of a process are combined to enable a larger process, where patents covering sub-components of a system or steps in a process are pooled, where elements of a video game include sub-component assets from different creators, where a book contains contributions from multiple authors, and the like. In embodiments, a smart IP wrapper aggregates licensing terms for different intellectual property items (including digital goods, including ones embodying different types of intellectual property rights, and transaction data involving the item, as well as optionally one or more portions of the item corresponding to the transaction data, are stored in a distributed ledger that is configured to enable validation of agreement to the licensing terms (such as at appoint of use) and/or access control to the item. In embodiments, a royalty apportionment wrapper 115 may be provided in a system having a distributed ledger for aggregating intellectual property licensing terms, wherein a smart contract wrapper on the distributed ledger allows an operation on the ledger to add intellectual property and to agree to an apportionment of royalties among the parties in the ledger. Thus, a ledger may accumulate contributions to the ledger along with evidence of agreement to the apportionment of any royalties among the contributors of the IP that is embedded in and/or controlled by the ledger. The ledger may record licensing terms and automatically vary them as new contributions are made, such as by one or more rules. For example, contributors may be given a share of a royalty stack according to a rule, such as based on a fractional contribution, such as based on lines of code contributed, lines of authorship, contribution to components of a system, and the like. In embodiments, a distributed ledger may be forked into versions that represent varying combinations of sub-components of IP, such as to allow users to select combinations that are of most use, thereby allowing contributors who have contributed the most value to be rewarded. Variation and outcome tracking may be iteratively improved, such as by machine learning.

In embodiments, a distributed ledger is provided for aggregating intellectual property licensing terms, wherein a smart contract wrapper on the distributed ledger allows an operation on the ledger to add intellectual property to an aggregate stack of intellectual property.

In embodiments, the platform 100 may have an improved distributed ledger for aggregating intellectual property licensing terms, wherein a smart contract wrapper on the distributed ledger allows an operation on the ledger to commit a party to a contract term via an IP transaction wrapper 119 of the ledger. This may include operations involving cryptocurrencies, tokens, or other operations, as well as conventional payments and in-kind transfers, such as of various resources described herein. The ledger may accumulate evidence of commitments to IP transactions by parties, such as entering into royalty terms, revenue sharing terms, IP ownership terms, warranty and liability terms, license permissions and restrictions, field of use terms, and many others.

In embodiments, improved distributed ledgers may include ones having a tokenized instruction set, such that operation on the distributed ledger provides provable access to the instruction set. A party wishing to share permission to know how, a trade secret or other valuable instructions may thus share the instruction set via a distributed ledger that captures and stores evidence of an action on the ledger by a third party, thereby evidencing access and agreement to terms and conditions of access. In embodiments, the platform 100 may have a distributed ledger that tokenizes executable algorithmic logic 121, such that operation on the distributed ledger provides provable access to the executable algorithmic logic. A variety of instruction sets may be stored by a distributed ledger, such as to verify access and verify agreement to terms (such as smart contract terms). In embodiments, instruction sets that embody trade secrets may be separated into sub-components, so that operations must occur on multiple ledgers to get (provable) access to a trade secret. This may permit parties wishing to share secrets, such as with multiple sub-contractors or vendors, to main provable access control, while separating components among different vendors to avoid sharing an entire set with a single party. Various kinds of executable instruction sets may be stored on specialized distributed ledgers that may include smart wrappers for specific types of instruction sets, such that provable access control, validation of terms, and tracking of utilization may be performed by operations on the distributed ledger (which may include triggering access controls within a content management system or other systems upon validation of actions taken in a smart contract on the ledger. In embodiments, the platform 100 may have a distributed ledger that tokenizes a 3D printer instruction set 123, such that operation on the distributed ledger provides provable access to the instruction set.

In embodiments, the platform 100 may have a distributed ledger that tokenizes an instruction set for a coating process 125, such that operation on the distributed ledger provides provable access to the instruction set.

In embodiments, the platform 100 may have a distributed ledger that tokenizes an instruction set for a semiconductor fabrication process 129, such that operation on the distributed ledger provides provable access to the fabrication process.

In embodiments, the platform 100 may have a distributed ledger that tokenizes a firmware program 131, such that operation on the distributed ledger provides provable access to the firmware program.

In embodiments, the platform 100 may have a distributed ledger that tokenizes an instruction set for an FPGA 133, such that operation on the distributed ledger provides provable access to the FPGA.

In embodiments, the platform 100 may have a distributed ledger that tokenizes serverless code logic 135, such that operation on the distributed ledger provides provable access to the serverless code logic.

In embodiments, the platform 100 may have a distributed ledger that tokenizes an instruction set for a crystal fabrication system 139, such that operation on the distributed ledger provides provable access to the instruction set.

In embodiments, the platform 100 may have a distributed ledger that tokenizes an instruction set for a food preparation process 141, such that operation on the distributed ledger provides provable access to the instruction set.

In embodiments, the platform 100 may have a distributed ledger that tokenizes an instruction set for a polymer production process 143, such that operation on the distributed ledger provides provable access to the instruction set.

In embodiments, the platform 100 may have a distributed ledger that tokenizes an instruction set for chemical synthesis process 145, such that operation on the distributed ledger provides provable access to the instruction set.

In embodiments, the platform 100 may have a distributed ledger that tokenizes an instruction set for a biological production process 149, such that operation on the distributed ledger provides provable access to the instruction set.

In embodiments, the platform 100 may have a distributed ledger that tokenizes a trade secret with an expert wrapper 151, such that operation on the distributed ledger provides provable access to the trade secret and the wrapper provides validation of the trade secret by the expert. An interface may be provided by which an expert accesses the trade secret on the ledger and verifies that the information is accurate and sufficient to allow a third party to use the secret.

In embodiments, the platform 100 may have a distributed ledger that aggregates views of a trade secret into a chain that proves which and how many parties have viewed the trade secret. Views may be used to allocate value to creators of the trade secret, to operators of the platform 100, or the like.

In embodiments, the platform 100 may have a distributed ledger that tokenizes an instruction set 111, such that operation on the distributed ledger provides provable access 155 to the instruction set and execution of the instruction set on a system results in recording a transaction in the distributed ledger.

In embodiments, the platform 100 may have a distributed ledger that tokenizes an item of intellectual property and a reporting system that reports an analytic result based on the operations performed on the distributed ledger or the intellectual property.

In embodiments, the platform 100 may have a distributed ledger that aggregates a set of instructions, where an operation on the distributed ledger adds at least one instruction to a pre-existing set of instructions 161 to provide a modified set of instructions.

Referring still to FIG. 3, an intelligent cryptocurrency execution engine 183 may provide intelligence for the timing, location, and other attributes of a cryptocurrency transaction, such as a mining transaction, an exchange transaction, a storage transaction, a retrieval transaction, or the like. Cryptocurrencies like Bitcoin™ are increasingly widespread, with specialized coins having emerged for a wide variety of purposes, such as exchanging value in various specialized market domains. Initial offerings of such coins, or ICOs, are increasingly subject to regulations, such as securities regulations, and in some cases to taxation. Thus, while cryptocurrency transactions typically occur within computer networks, jurisdictional factors may be important in determining where, when, and how to execute a transaction, store a cryptocurrency, exchange it for value. In embodiments, intelligent cryptocurrency execution engine 183 may use features embedded in or wrapped around the digital object representing a coin, such as features that cause the execution of transactions in the coin to be undertaken with awareness of various conditions, including geographic conditions, regulatory conditions, tax conditions, market conditions, and the like.

In embodiments, the platform 100 may include a tax aware coin 165 or smart wrapper for a cryptocurrency coin that directs execution of a transaction involving the coin to a geographic location based on tax treatment of at least one of the coin and the transaction in the geographic location.

In embodiments, the platform 100 may include a location-aware coin 169 or smart wrapper that enables a self-executing cryptocurrency coin that commits a transaction upon recognizing a location-based parameter that provides favorable tax treatment.

In embodiments, the platform 100 may include an expert system or AI agent 171 that uses machine learning to optimize the execution of cryptocurrency transactions based on tax status. Machine learning may use one or more models or heuristics, such as populated with relevant jurisdictional tax data, may be trained on a training set of human trading operations, may be supervised by human supervisors, and/or may use a deep learning technique based on outcomes over time, such as when operating on a wide range of internal system data and external data sources 182 as described throughout this disclosure.

In embodiments, the platform 100 may include regulation aware coin 173 having a coin, a smart wrapper, and/or an expert system that aggregates regulatory information covering cryptocurrency transactions and automatically selects a jurisdiction for an operation based on the regulatory information. Machine learning may use one or more models or heuristics, such as populated with relevant jurisdictional regulatory data, may be trained on a training set of human trading operations, may be supervised by human supervisors, and/or may use a deep learning technique based on outcomes over time, such as when operating on a wide range of internal system data and external data sources 182 as described throughout this disclosure.

In embodiments, the platform 100 may include an energy price-aware coin 175, wrapper, or expert system that uses machine learning to optimize the execution of a cryptocurrency transaction based on real time energy price information for an available energy source. Cryptocurrency transactions, such as coin mining and blockchain operations, may be highly energy intensive. An energy price-aware coin may be configured to time such operations based on energy price forecasts, such as with one or more of the intelligent forecasting engines 192 described throughout this disclosure.

In embodiments, the platform 100 may include an energy source aware coin 179, wrapper, or expert system that uses machine learning to optimize the execution of a cryptocurrency transaction based on an understanding of available energy sources to power computing resources to execute the transaction. For example, coin mining may be performed only when renewable energy sources are available. Machine learning for optimization of a transaction may use one or more models or heuristics, such as populated with relevant energy source data (such as may be captured in a knowledge graph, which may contain energy source information by type, location and operating parameters), may be trained on a training set of input-output data for human-initiated transactions, may be supervised by human supervisors, and/or may use a deep learning technique based on outcomes over time, such as when operating on a wide range of internal system data and external data sources 182 as described throughout this disclosure.

In embodiments, the platform 100 may include a charging cycle aware coin 181, wrapper, or an expert system that uses machine learning to optimize charging and recharging cycle of a rechargeable battery system to provide energy for execution of a cryptocurrency transaction. For example, a battery may be discharged for a cryptocurrency transaction only if a minimum threshold of battery charge is maintained for other operational use, if re-charging resources are known to be readily available, or the like. Machine learning for optimization of charging and recharging may use one or more models or heuristics, such as populated with relevant battery data (such as may be captured in a knowledge graph, which may contain energy source information by type, location and operating parameters), may be trained on a training set of human operations, may be supervised by human supervisors, and/or may use a deep learning technique based on outcomes over time, such as when operating on a wide range of internal system data and external data sources 182 as described throughout this disclosure.

Optimization of various intelligent coin operations may occur with machine learning that is trained on outcomes, such as financial profitability. Any of the machine learning systems described throughout this disclosure may be used for optimization of intelligent cryptocurrency transaction management.

In embodiments, compute resources, such as those mentioned throughout this disclosure, may be allocated to perform a range of computing tasks, both for operations that occur within the platform 100, ones that are managed by the platform, and ones that involve the activities, workflows and processes of various assets that may be owned, operated or managed in conjunction with the platform, such as sets or fleets of assets that have or use computing resources. Examples of compute tasks include, without limitation, cryptocurrency mining, distributed ledger calculations and storage, forecasting tasks, transaction execution tasks, spot market testing tasks, internal data collection tasks, external data collection, machine learning tasks, and others. As noted above, energy, compute resources, bandwidth, spectrum, and other resources may be coordinated, such as by machine learning, for these tasks. Outcome and feedback information may be provided for the machine learning, such as outcomes for any of the individual tasks and overall outcomes, such as yield and profitability for business or other operations involving the tasks.

In embodiments, networking resources, such as those mentioned throughout this disclosure, may be allocated to perform a range of networking tasks, both for operations that occur within the platform 100, ones that are managed by the platform, and ones that involve the activities, workflows and processes of various assets that may be owned, operated or managed in conjunction with the platform, such as sets or fleets of assets that have or use networking resources. Examples of networking tasks include cognitive network coordination, network coding, peer bandwidth sharing (including, for example cost-based routing, value-based routing, outcome-based routing, and the like), distributed transaction execution, spot market testing, randomization (e.g., using genetic programming with outcome feedback to vary network configurations and transmission paths), internal data collection and external data collection. As noted above, energy, compute resources, bandwidth, spectrum, and other resources may be coordinated, such as by machine learning, for these networking tasks. Outcome and feedback information may be provided for the machine learning, such as outcomes for any of the individual tasks and overall outcomes, such as yield and profitability for business or other operations involving the tasks.

In embodiments, data storage resources, such as those mentioned throughout this disclosure, may be allocated to perform a range of data storage tasks, both for operations that occur within the platform 100, ones that are managed by the platform, and ones that involve the activities, workflows and processes of various assets that may be owned, operated or managed in conjunction with the platform, such as sets or fleets of assets that have or use networking resources. Examples of data storage tasks include distributed ledger storage, storage of internal data (such as operational data with the platform), cryptocurrency storage, smart wrapper storage, storage of external data, storage of feedback and outcome data, and others. As noted above, data storage, energy, compute resources, bandwidth, spectrum, and other resources may be coordinated, such as by machine learning, for these data storage tasks. Outcome and feedback information may be provided for the machine learning, such as outcomes for any of the individual tasks and overall outcomes, such as yield and profitability for business or other operations involving the tasks.

In embodiments, smart contracts, such as ones embodying terms relating to intellectual property, trade secrets, know how, instruction sets, algorithmic logic, and the like may embody or include contract terms, which may include terms and conditions for options, royalty stacking terms, field exclusivity, partial exclusivity, pooling of intellectual property, standards terms (such as relating to essential and non-essential patent usage), technology transfer terms, consulting service terms, update terms, support terms, maintenance terms, derivative works terms, copying terms, and performance-related rights or metrics, among many others.

In embodiments, where an instruction set is embodied in digital form, such as contained in or managed by a distributed ledger transactions system, various systems may be configured with interfaces that allow them to access and use the instruction sets. In embodiments, such systems may include access control features that validate proper licensing by inspection of a distributed ledger, a key, a token, or the like that indicates the presence of access rights to an instruction set. Such systems that execute distributed instruction sets may include systems for 3D printing, crystal fabrication, semiconductor fabrication, coating items, producing polymers, chemical synthesis, and biological production, among others.

Networking capabilities and network resources should be understood to include a wide range of networking systems, components and capabilities, including infrastructure elements for 3G, 4G, LTE, 5G and other cellular network types, access points, routers, and other Wi-Fi elements, cognitive networking systems and components, mobile networking systems and components, physical layer, MAC layer and application layer systems and components, cognitive networking components and capabilities, peer-to-peer networking components and capabilities, optical networking components and capabilities, and others.

Neural Net Systems

Referring to FIG. 4 through FIG. 31, embodiments of the present disclosure, including ones involving expert systems, self-organization, machine learning, artificial intelligence, and the like, may benefit from the use of a neural net, such as a neural net trained for pattern recognition, for classification of one or more parameters, characteristics, or phenomena, for support of autonomous control, and other purposes. References to a neural net throughout this disclosure should be understood to encompass a wide range of different types of neural networks, machine learning systems, artificial intelligence systems, and the like, such as feed forward neural networks, radial basis function neural networks, self-organizing neural networks (e.g., Kohonen self-organizing neural networks), recurrent neural networks, modular neural networks, artificial neural networks, physical neural networks, multi-layered neural networks, convolutional neural networks, hybrids of neural networks with other expert systems (e.g., hybrid fuzzy logic-neural network systems), Autoencoder neural networks, probabilistic neural networks, time delay neural networks, convolutional neural networks, regulatory feedback neural networks, radial basis function neural networks, recurrent neural networks, Hopfield neural networks, Boltzmann machine neural networks, self-organizing map (SOM) neural networks, learning vector quantization (LVQ) neural networks, fully recurrent neural networks, simple recurrent neural networks, echo state neural networks, long short-term memory neural networks, bi-directional neural networks, hierarchical neural networks, stochastic neural networks, genetic scale RNN neural networks, committee of machines neural networks, associative neural networks, physical neural networks, instantaneously trained neural networks, spiking neural networks, neocognitron neural networks, dynamic neural networks, cascading neural networks, neuro-fuzzy neural networks, compositional pattern-producing neural networks, memory neural networks, hierarchical temporal memory neural networks, deep feed forward neural networks, gated recurrent unit (GCU) neural networks, auto encoder neural networks, variational auto encoder neural networks, denoising auto encoder neural networks, sparse auto-encoder neural networks, Markov chain neural networks, restricted Boltzmann machine neural networks, deep belief neural networks, deep convolutional neural networks, de-convolutional neural networks, deep convolutional inverse graphics neural networks, generative adversarial neural networks, liquid state machine neural networks, extreme learning machine neural networks, echo state neural networks, deep residual neural networks, support vector machine neural networks, neural Turing machine neural networks, and/or holographic associative memory neural networks, or hybrids or combinations of the foregoing, or combinations with other expert systems, such as rule-based systems, model-based systems (including ones based on physical models, statistical models, flow-based models, biological models, biomimetic models, and the like).

Figure 4:
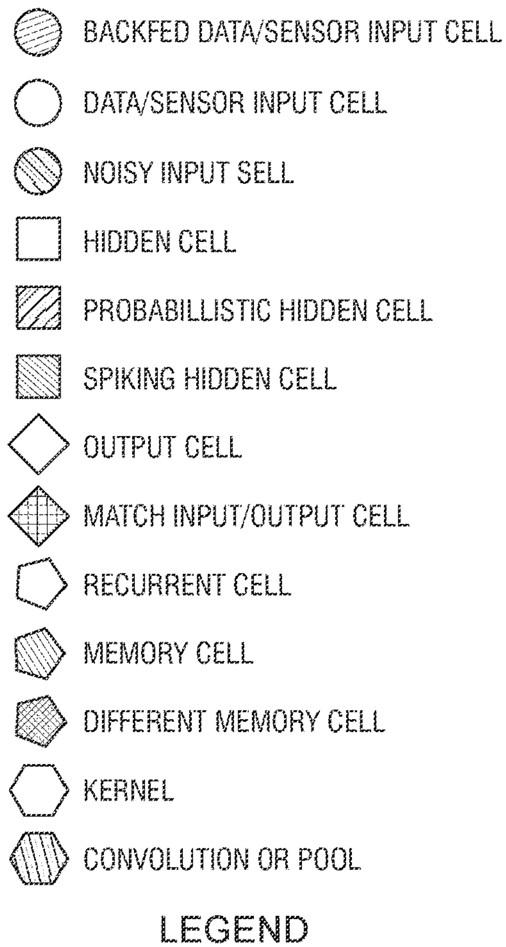
FIG. 4 to FIG. 31 are schematic diagrams of embodiments of neural net systems that may connect to, be integrated in, and be accessible by the platform for enabling intelligent transactions including ones involving expert systems, self-organization, machine learning, artificial intelligence and including neural net systems trained for pattern recognition, for classification of one or more parameters, characteristics, or phenomena, for support of autonomous control, and other purposes in accordance with embodiments of the present disclosure.

In embodiments, FIGS. 5-31 depict exemplary neural networks and FIG. 4 depicts a legend showing the various components of the neural networks depicted throughout FIGS. 5-31. FIG. 4 depicts various neural net components depicted in cells that are assigned functions and requirements. In embodiments, the various neural net examples may include back fed data/sensor cells, data/sensor cells, noisy input cells, and hidden cells. The neural net components also include probabilistic hidden cells, spiking hidden cells, output cells, match input/output cells, recurrent cells, memory cells, different memory cells, kernels, and convolution or pool cells.

Figure 5:
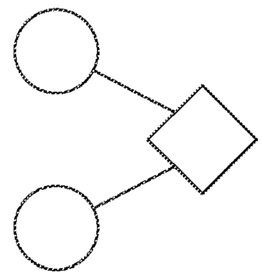
Figure 11:
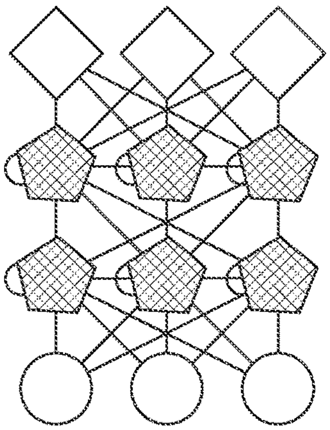
Figure 10:
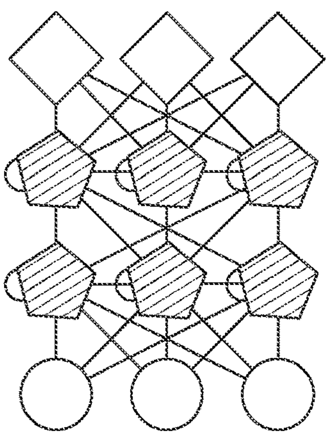
Figure 9:
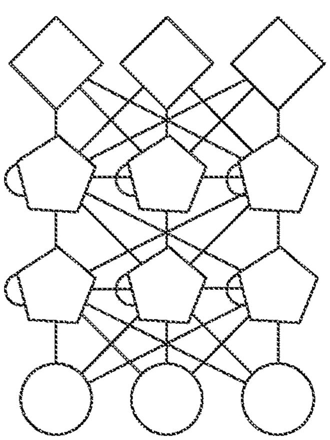
Figure 15:
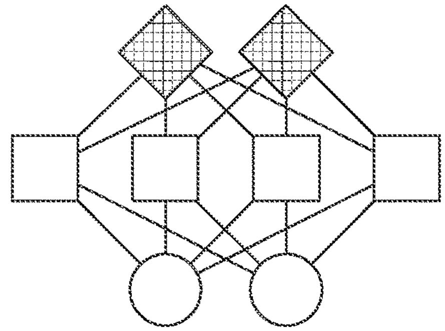
Figure 14:
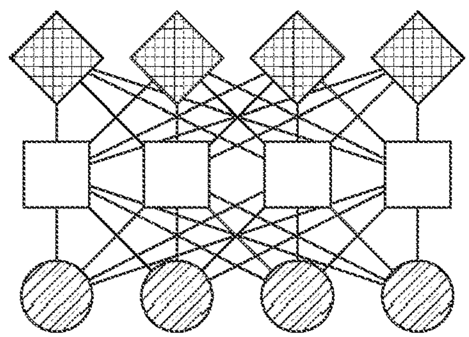
Figure 13:
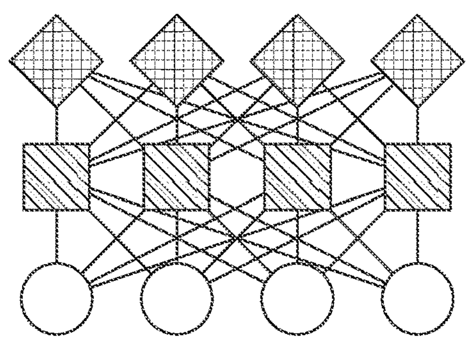
Figure 12:
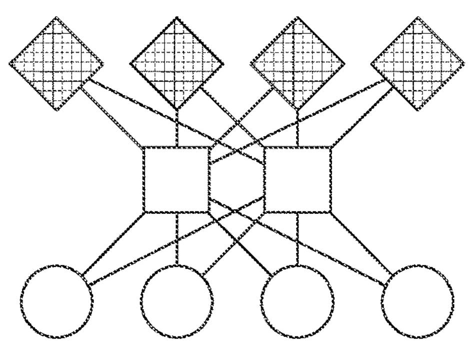
Figure 16:
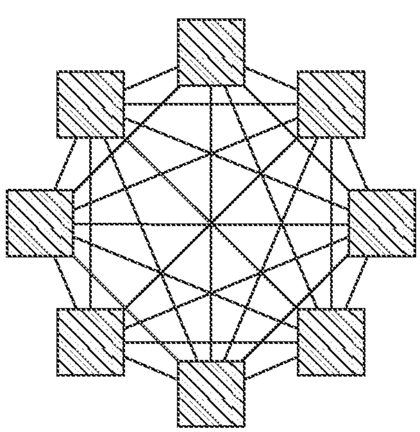
Figure 17:
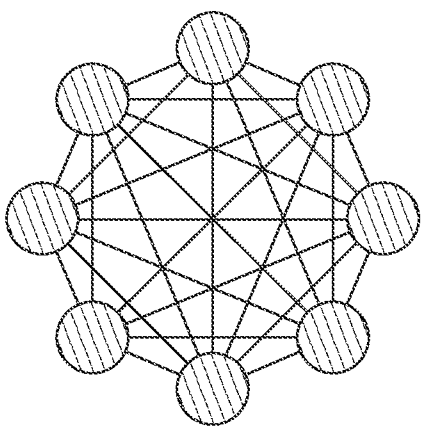
Figure 18:
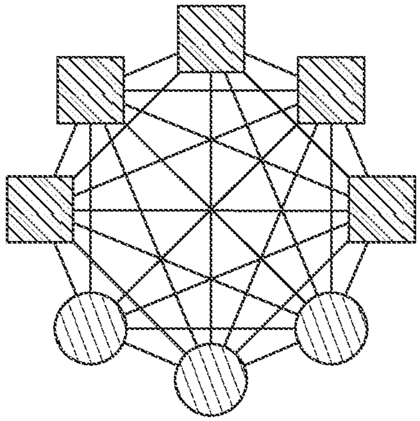
Figure 19:
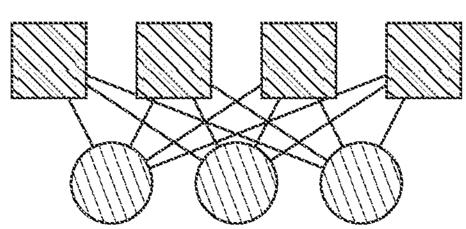
Figure 20:
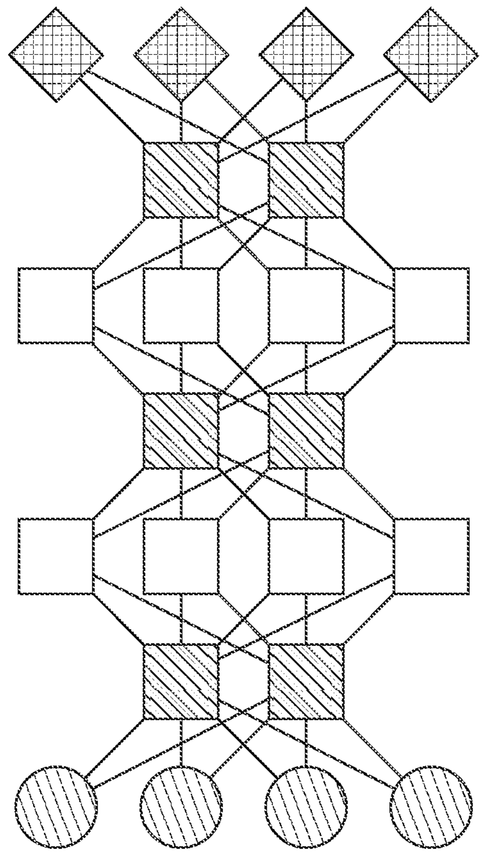
Figure 22:
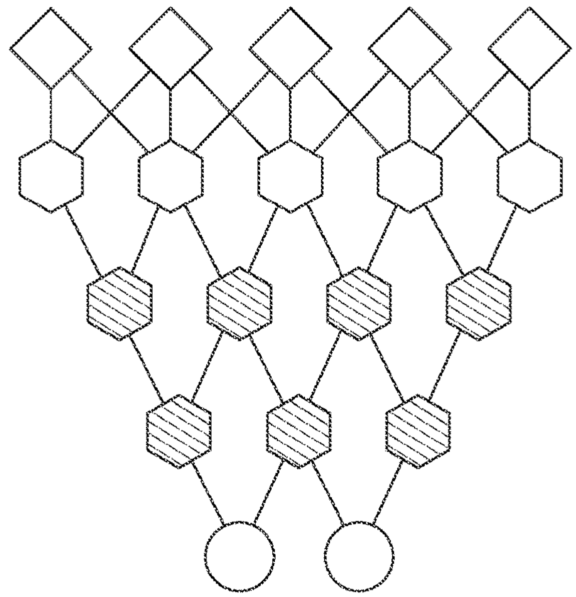
Figure 21:
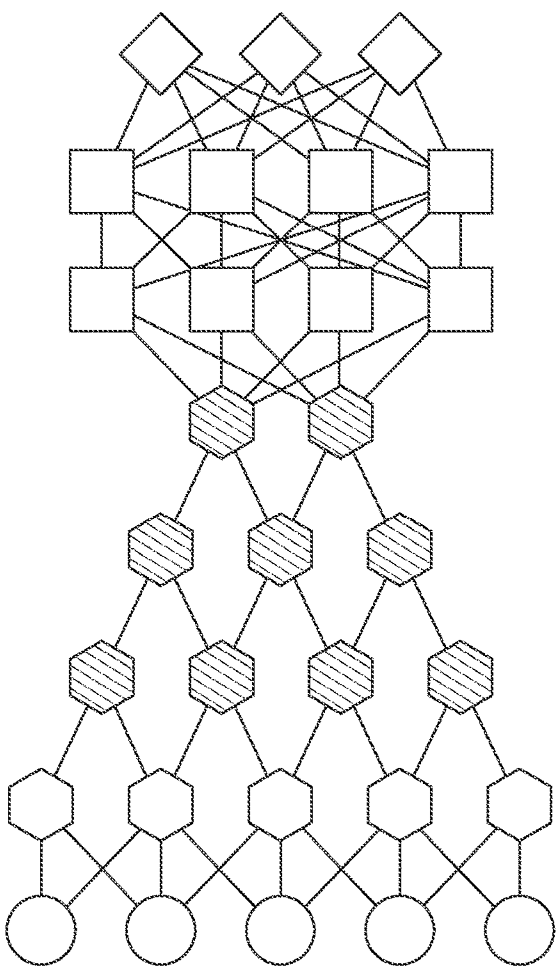
Figure 23:
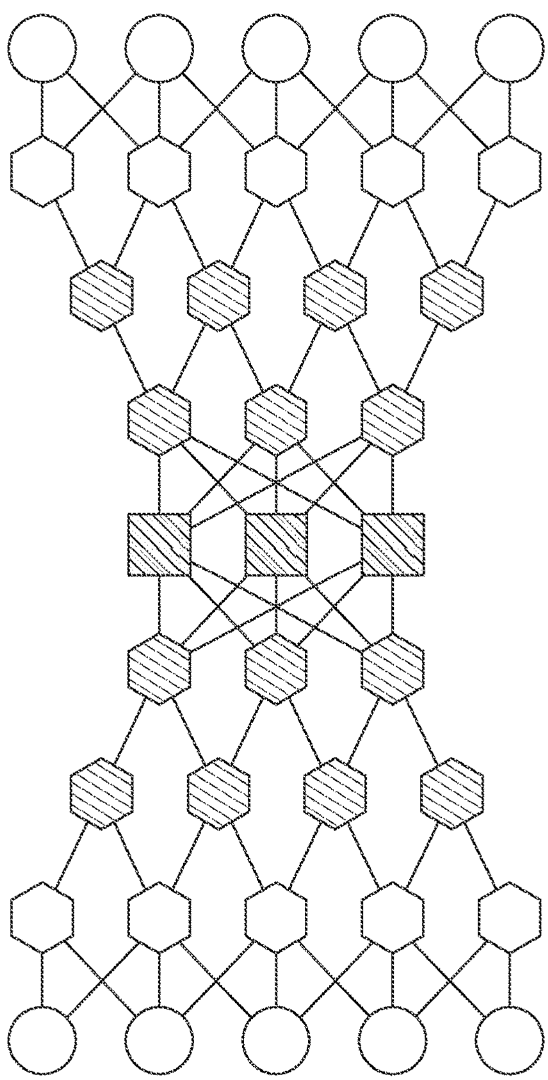
Figure 24:
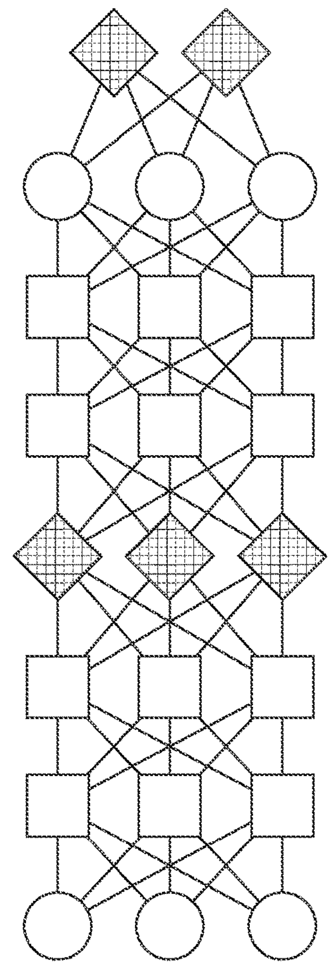
Figure 25:
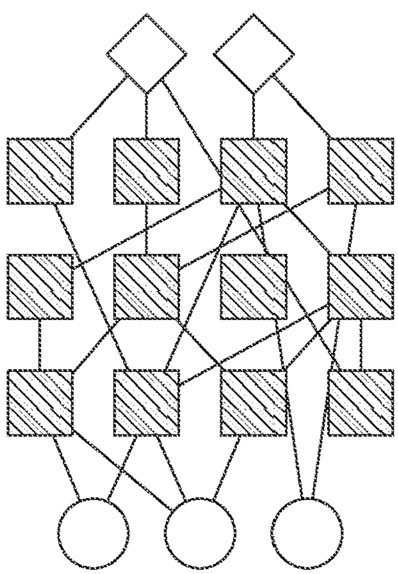
Figure 26:
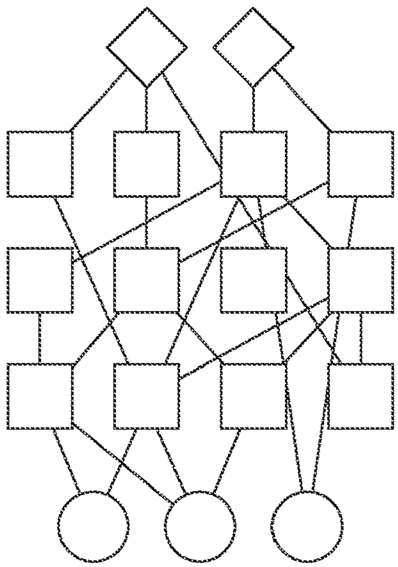
Figure 27:
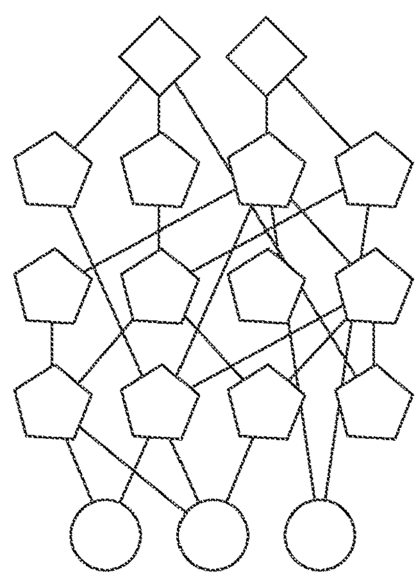
Figure 28:
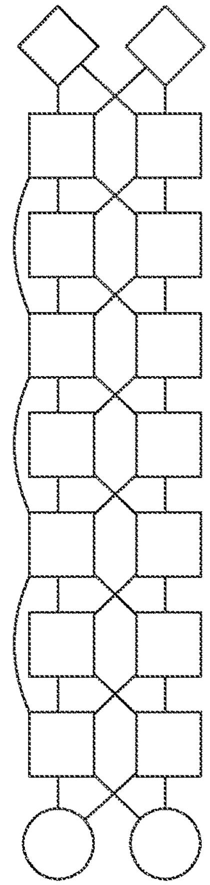
Figure 29:
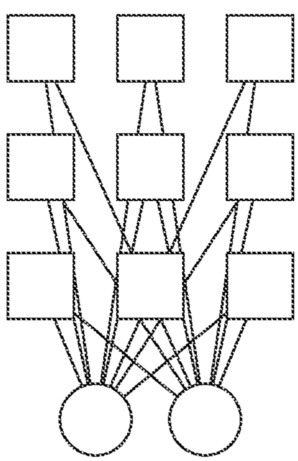
Figure 30:
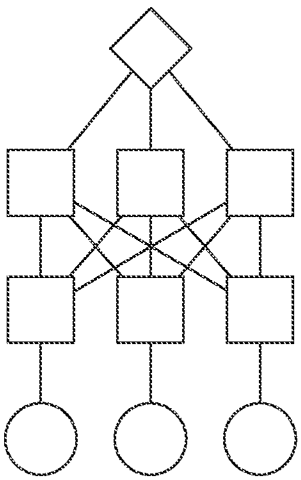
Figure 31:
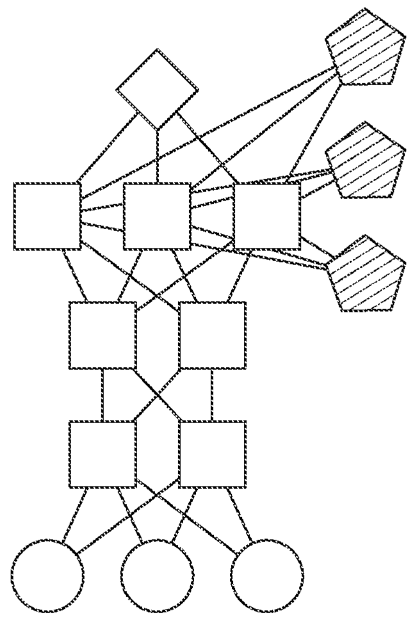

In embodiments, FIG. 5 depicts an exemplary perceptron neural network that may connect to, integrate with, or interface with the platform 100. The platform may also be associated with further neural net systems such as a feed forward neural network (FIG. 6), a radial basis neural network (FIG. 7), a deep feed forward neural network (FIG. 8), a recurrent neural network (FIG. 9), a long/short term neural network (FIG. 10), and a gated recurrent neural network (FIG. 11). The platform may also be associated with further neural net systems such as an auto encoder neural network (FIG. 12), a variational neural network (FIG. 13), a denoising neural network (FIG. 14), a sparse neural network (FIG. 15), a Markov chain neural network (FIG. 16), and a Hopfield network neural network (FIG. 17). The platform may further be associated with additional neural net systems such as a Boltzmann machine neural network (FIG. 18), a restricted BM neural network (FIG. 19), a deep belief neural network (FIG. 20), a deep convolutional neural network (FIG. 21), a deconvolutional neural network (FIG. 22), and a deep convolutional inverse graphics neural network (FIG. 23). The platform may also be associated with further neural net systems such as a generative adversarial neural network (FIG. 24), a liquid state machine neural network (FIG. 25), an extreme learning machine neural network (FIG. 26), an echo state neural network (FIG. 27), a deep residual neural network (FIG. 28), a Kohonen neural network (FIG. 29), a support vector machine neural network (FIG. 30), and a neural Turing machine neural network (FIG. 31).

The foregoing neural networks may have a variety of nodes or neurons, which may perform a variety of functions on inputs, such as inputs received from sensors or other data sources, including other nodes. Functions may involve weights, features, feature vectors, and the like. Neurons may include perceptrons, neurons that mimic biological functions (such as of the human senses of touch, vision, taste, hearing, and smell), and the like. Continuous neurons, such as with sigmoidal activation, may be used in the context of various forms of neural net, such as where back propagation is involved.

In many embodiments, an expert system or neural network may be trained, such as by a human operator or supervisor, or based on a data set, model, or the like. Training may include presenting the neural network with one or more training data sets that represent values, such as sensor data, event data, parameter data, and other types of data (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more transactional environments and transmitted to the cloud platform over one or more networks, including using network coding to provide efficient transmission. In the cloud platform, optionally using massively parallel computational capability, a plurality of different neural networks of various types (including modular forms, structure-adaptive forms, hybrids, and the like) may be used to undertake prediction, classification, control functions, and provide other outputs as described in connection with expert systems disclosed throughout this disclosure. The different neural networks may be structured to compete with each other (optionally including use evolutionary algorithms, genetic algorithms, or the like), such that an appropriate type of neural network, with appropriate input sets, weights, node types and functions, and the like, may be selected, such as by an expert system, for a specific task involved in a given context, workflow, environment process, system, or the like.

In embodiments, methods and systems described herein that involve an expert system or self-organization capability may use a feed forward neural network, which moves information in one direction, such as from a data input, like a data source related to at least one resource or parameter related to a transactional environment, such as any of the data sources mentioned throughout this disclosure, through a series of neurons or nodes, to an output. Data may move from the input nodes to the output nodes, optionally passing through one or more hidden nodes, without loops. In embodiments, feed forward neural networks may be constructed with various types of units, such as binary McCulloch-Pitts neurons, the simplest of which is a perceptron.

In embodiments, methods and systems described herein that involve an expert system or self-organization capability may use a capsule neural network, such as for prediction, classification, or control functions with respect to a transactional environment, such as relating to one or more of the machines and automated systems described throughout this disclosure.

In embodiments, methods and systems described herein that involve an expert system or self-organization capability may use a radial basis function (RBF) neural network, which may be preferred in some situations involving interpolation in a multi-dimensional space (such as where interpolation is helpful in optimizing a multi-dimensional function, such as for optimizing a data marketplace as described here, optimizing the efficiency or output of a power generation system, a factory system, or the like, or other situation involving multiple dimensions. In embodiments, each neuron in the RBF neural network stores an example from a training set as a "prototype." Linearity involved in the functioning of this neural network offers RBF the advantage of not typically suffering from problems with local minima or maxima.

In embodiments, methods and systems described herein that involve an expert system or self-organization capability may use a radial basis function (RBF) neural network, such as one that employs a distance criterion with respect to a center (e.g., a Gaussian function). A radial basis function may be applied as a replacement for a hidden layer, such as a sigmoidal hidden layer transfer, in a multi-layer perceptron. An RBF network may have two layers, such as where an input is mapped onto each RBF in a hidden layer. In embodiments, an output layer may comprise a linear combination of hidden layer values representing, for example, a mean predicted output. The output layer value may provide an output that is the same as or similar to that of a regression model in statistics. In classification problems, the output layer may be a sigmoid function of a linear combination of hidden layer values, representing a posterior probability. Performance in both cases is often improved by shrinkage techniques, such as ridge regression in classical statistics. This corresponds to a prior belief in small parameter values (and therefore smooth output functions) in a Bayesian framework. RBF networks may avoid local minima, because the only parameters that are adjusted in the learning process are the linear mapping from hidden layer to output layer. Linearity ensures that the error surface is quadratic and therefore has a single minimum. In regression problems, this may be found in one matrix operation. In classification problems, the fixed non-linearity introduced by the sigmoid output function may be handled using an iteratively re-weighted least squares function or the like. RBF networks may use kernel methods such as support vector machines (SVM) and Gaussian processes (where the RBF is the kernel function). A non-linear kernel function may be used to project the input data into a space where the learning problem may be solved using a linear model.

In embodiments, an RBF neural network may include an input layer, a hidden layer, and a summation layer. In the input layer, one neuron appears in the input layer for each predictor variable. In the case of categorical variables, N−1 neurons are used, where N is the number of categories. The input neurons may, in embodiments, standardize the value ranges by subtracting the median and dividing by the interquartile range. The input neurons may then feed the values to each of the neurons in the hidden layer. In the hidden layer, a variable number of neurons may be used (determined by the training process). Each neuron may consist of a radial basis function that is centered on a point with as many dimensions as a number of predictor variables. The spread (e.g., radius) of the RBF function may be different for each dimension. The centers and spreads may be determined by training. When presented with the vector of input values from the input layer, a hidden neuron may compute a Euclidean distance of the test case from the neuron's center point and then apply the RBF kernel function to this distance, such as using the spread values. The resulting value may then be passed to the summation layer. In the summation layer, the value coming out of a neuron in the hidden layer may be multiplied by a weight associated with the neuron and may add to the weighted values of other neurons. This sum becomes the output. For classification problems, one output is produced (with a separate set of weights and summation units) for each target category. The value output for a category is the probability that the case being evaluated has that category. In training of an RBF, various parameters may be determined, such as the number of neurons in a hidden layer, the coordinates of the center of each hidden-layer function, the spread of each function in each dimension, and the weights applied to outputs as they pass to the summation layer. Training may be used by clustering algorithms (such as k-means clustering), by evolutionary approaches, and the like.

In embodiments, a recurrent neural network may have a time-varying, real-valued (more than just zero or one) activation (output). Each connection may have a modifiable real-valued weight. Some of the nodes are called labeled nodes, some output nodes, and others hidden nodes. For supervised learning in discrete time settings, training sequences of real-valued input vectors may become sequences of activations of the input nodes, one input vector at a time. At each time step, each non-input unit may compute its current activation as a nonlinear function of the weighted sum of the activations of all units from which it receives connections. The system may explicitly activate (independent of incoming signals) some output units at certain time steps.

In embodiments, methods and systems described herein that involve an expert system or self-organization capability may use a self-organizing neural network, such as a Kohonen self-organizing neural network, such as for visualization of views of data, such as low-dimensional views of high-dimensional data. The self-organizing neural network may apply competitive learning to a set of input data, such as from one or more sensors or other data inputs from or associated with a transactional environment, including any machine or component that relates to the transactional environment. In embodiments, the self-organizing neural network may be used to identify structures in data, such as unlabeled data, such as in data sensed from a range of data sources about or sensors in or about in a transactional environment, where sources of the data are unknown (such as where events may be coming from any of a range of unknown sources). The self-organizing neural network may organize structures or patterns in the data, such that they may be recognized, analyzed, and labeled, such as identifying market behavior structures as corresponding to other events and signals.

In embodiments, methods and systems described herein that involve an expert system or self-organization capability may use a recurrent neural network, which may allow for a bi-directional flow of data, such as where connected units (e.g., neurons or nodes) form a directed cycle. Such a network may be used to model or exhibit dynamic temporal behavior, such as involved in dynamic systems, such as a wide variety of the automation systems, machines and devices described throughout this disclosure, such as an automated agent interacting with a marketplace for purposes of collecting data, testing spot market transactions, execution transactions, and the like, where dynamic system behavior involves complex interactions that a user may desire to understand, predict, control and/or optimize. For example, the recurrent neural network may be used to anticipate the state of a market, such as one involving a dynamic process or action, such as a change in state of a resource that is traded in or that enables a marketplace of transactional environment. In embodiments, the recurrent neural network may use internal memory to process a sequence of inputs, such as from other nodes and/or from sensors and other data inputs from or about the transactional environment, of the various types described herein. In embodiments, the recurrent neural network may also be used for pattern recognition, such as for recognizing a machine, component, agent, or other item based on a behavioral signature, a profile, a set of feature vectors (such as in an audio file or image), or the like. In a non-limiting example, a recurrent neural network may recognize a shift in an operational mode of a marketplace or machine by learning to classify the shift from a training data set consisting of a stream of data from one or more data sources of sensors applied to or about one or more resources.

In embodiments, methods and systems described herein that involve an expert system or self-organization capability may use a modular neural network, which may comprise a series of independent neural networks (such as ones of various types described herein) that are moderated by an intermediary. Each of the independent neural networks in the modular neural network may work with separate inputs, accomplishing subtasks that make up the task the modular network as whole is intended to perform. For example, a modular neural network may comprise a recurrent neural network for pattern recognition, such as to recognize what type of machine or system is being sensed by one or more sensors that are provided as input channels to the modular network and an RBF neural network for optimizing the behavior of the machine or system once understood. The intermediary may accept inputs of each of the individual neural networks, process them, and create output for the modular neural network, such an appropriate control parameter, a prediction of state, or the like.

Combinations among any of the pairs, triplets, or larger combinations, of the various neural network types described herein, are encompassed by the present disclosure. This may include combinations where an expert system uses one neural network for recognizing a pattern (e.g., a pattern indicating a problem or fault condition) and a different neural network for self-organizing an activity or workflow based on the recognized pattern (such as providing an output governing autonomous control of a system in response to the recognized condition or pattern). This may also include combinations where an expert system uses one neural network for classifying an item (e.g., identifying a machine, a component, or an operational mode) and a different neural network for predicting a state of the item (e.g., a fault state, an operational state, an anticipated state, a maintenance state, or the like). Modular neural networks may also include situations where an expert system uses one neural network for determining a state or context (such as a state of a machine, a process, a workflow, a marketplace, a storage system, a network, a data collector, or the like) and a different neural network for self-organizing a process involving the state or context (e.g., a data storage process, a network coding process, a network selection process, a data marketplace process, a power generation process, a manufacturing process, a refining process, a digging process, a boring process, or other process described herein).

In embodiments, methods and systems described herein that involve an expert system or self-organization capability may use a physical neural network where one or more hardware elements is used to perform or simulate neural behavior. In embodiments, one or more hardware neurons may be configured to stream voltage values, current values, or the like that represent sensor data, such as to calculate information from analog sensor inputs representing energy consumption, energy production, or the like, such as by one or more machines providing energy or consuming energy for one or more transactions. One or more hardware nodes may be configured to stream output data resulting from the activity of the neural net. Hardware nodes, which may comprise one or more chips, microprocessors, integrated circuits, programmable logic controllers, application-specific integrated circuits, field-programmable gate arrays, or the like, may be provided to optimize the machine that is producing or consuming energy, or to optimize another parameter of some part of a neural net of any of the types described herein. Hardware nodes may include hardware for acceleration of calculations (such as dedicated processors for performing basic or more sophisticated calculations on input data to provide outputs, dedicated processors for filtering or compressing data, dedicated processors for decompressing data, dedicated processors for compression of specific file or data types (e.g., for handling image data, video streams, acoustic signals, thermal images, heat maps, or the like), and the like. A physical neural network may be embodied in a data collector, including one that may be reconfigured by switching or routing inputs in varying configurations, such as to provide different neural net configurations within the data collector for handling different types of inputs (with the switching and configuration optionally under control of an expert system, which may include a software-based neural net located on the data collector or remotely). A physical, or at least partially physical, neural network may include physical hardware nodes located in a storage system, such as for storing data within a machine, a data storage system, a distributed ledger, a mobile device, a server, a cloud resource, or in a transactional environment, such as for accelerating input/output functions to one or more storage elements that supply data to or take data from the neural net. A physical, or at least partially physical, neural network may include physical hardware nodes located in a network, such as for transmitting data within, to or from an industrial environment, such as for accelerating input/output functions to one or more network nodes in the net, accelerating relay functions, or the like. In embodiments, of a physical neural network, an electrically adjustable resistance material may be used for emulating the function of a neural synapse. In embodiments, the physical hardware emulates the neurons, and software emulates the neural network between the neurons. In embodiments, neural networks complement conventional algorithmic computers. They are versatile and may be trained to perform appropriate functions without the need for any instructions, such as classification functions, optimization functions, pattern recognition functions, control functions, selection functions, evolution functions, and others.

In embodiments, methods and systems described herein that involve an expert system or self-organization capability may use a multilayered feed forward neural network, such as for complex pattern classification of one or more items, phenomena, modes, states, or the like. In embodiments, a multilayered feed forward neural network may be trained by an optimization technique, such as a genetic algorithm, such as to explore a large and complex space of options to find an optimum, or near-optimum, global solution. For example, one or more genetic algorithms may be used to train a multilayered feed forward neural network to classify complex phenomena, such as to recognize complex operational modes of machines, such as modes involving complex interactions among machines (including interference effects, resonance effects, and the like), modes involving non-linear phenomena, modes involving critical faults, such as where multiple, simultaneous faults occur, making root cause analysis difficult, and others. In embodiments, a multilayered feed forward neural network may be used to classify results from monitoring of a marketplace, such as monitoring systems, such as automated agents, that operate within the marketplace, as well as monitoring resources that enable the marketplace, such as computing, networking, energy, data storage, energy storage, and other resources.

In embodiments, methods and systems described herein that involve an expert system or self-organization capability may use a feed-forward, back-propagation multi-layer perceptron (MLP) neural network, such as for handling one or more remote sensing applications, such as for taking inputs from sensors distributed throughout various transactional environments. In embodiments, the MLP neural network may be used for classification of transactional environments and resource environments, such as spot markets, forward markets, energy markets, renewable energy credit (REC) markets, networking markets, advertising markets, spectrum markets, ticketing markets, rewards markets, compute markets, and others mentioned throughout this disclosure, as well as physical resources and environments that produce them, such as energy resources (including renewable energy environments, mining environments, exploration environments, drilling environments, and the like, including classification of geological structures (including underground features and above ground features), classification of materials (including fluids, minerals, metals, and the like), and other problems. This may include fuzzy classification.

In embodiments, methods and systems described herein that involve an expert system or self-organization capability may use a structure-adaptive neural network, where the structure of a neural network is adapted, such as based on a rule, a sensed condition, a contextual parameter, or the like. For example, if a neural network does not converge on a solution, such as classifying an item or arriving at a prediction, when acting on a set of inputs after some amount of training, the neural network may be modified, such as from a feed forward neural network to a recurrent neural network, such as by switching data paths between some subset of nodes from unidirectional to bi-directional data paths. The structure adaptation may occur under control of an expert system, such as to trigger adaptation upon occurrence of a trigger, rule, or event, such as recognizing occurrence of a threshold (such as an absence of a convergence to a solution within a given amount of time) or recognizing a phenomenon as requiring different or additional structure (such as recognizing that a system is varying dynamically or in a non-linear fashion). In one non-limiting example, an expert system may switch from a simple neural network structure like a feed forward neural network to a more complex neural network structure like a recurrent neural network, a convolutional neural network, or the like upon receiving an indication that a continuously variable transmission is being used to drive a generator, turbine, or the like in a system being analyzed.

In embodiments, methods and systems described herein that involve an expert system or self-organization capability may use an autoencoder, autoassociator or Diabolo neural network, which may be similar to a multilayer perceptron (MLP) neural network, such as where there may be an input layer, an output layer and one or more hidden layers connecting them. However, the output layer in the auto-encoder may have the same number of units as the input layer, where the purpose of the MLP neural network is to reconstruct its own inputs (rather than just emitting a target value). Therefore, the auto encoders may operate as an unsupervised learning model. An auto encoder may be used, for example, for unsupervised learning of efficient codings, such as for dimensionality reduction, for learning generative models of data, and the like. In embodiments, an auto-encoding neural network may be used to self-learn an efficient network coding for transmission of analog sensor data from a machine over one or more networks or of digital data from one or more data sources. In embodiments, an auto-encoding neural network may be used to self-learn an efficient storage approach for storage of streams of data.

In embodiments, methods and systems described herein that involve an expert system or self-organization capability may use a probabilistic neural network (PNN), which, in embodiments, may comprise a multi-layer (e.g., four-layer) feed forward neural network, where layers may include input layers, hidden layers, pattern/summation layers and an output layer. In an embodiment of a PNN algorithm, a parent probability distribution function (PDF) of each class may be approximated, such as by a Parzen window and/or a non-parametric function. Then, using the PDF of each class, the class probability of a new input is estimated, and Bayes' rule may be employed, such as to allocate it to the class with the highest posterior probability. A PNN may embody a Bayesian network and may use a statistical algorithm or analytic technique, such as Kernel Fisher discriminant analysis technique. The PNN may be used for classification and pattern recognition in any of a wide range of embodiments disclosed herein. In one non-limiting example, a probabilistic neural network may be used to predict a fault condition of an engine based on collection of data inputs from sensors and instruments for the engine.

In embodiments, methods and systems described herein that involve an expert system or self-organization capability may use a time delay neural network (TDNN), which may comprise a feed forward architecture for sequential data that recognizes features independent of sequence position. In embodiments, to account for time shifts in data, delays are added to one or more inputs, or between one or more nodes, so that multiple data points (from distinct points in time) are analyzed together. A time delay neural network may form part of a larger pattern recognition system, such as using a perceptron network. In embodiments, a TDNN may be trained with supervised learning, such as where connection weights are trained with back propagation or under feedback. In embodiments, a TDNN may be used to process sensor data from distinct streams, such as a stream of velocity data, a stream of acceleration data, a stream of temperature data, a stream of pressure data, and the like, where time delays are used to align the data streams in time, such as to help understand patterns that involve understanding of the various streams (e.g., changes in price patterns in spot or forward markets).

In embodiments, methods and systems described herein that involve an expert system or self-organization capability may use a convolutional neural network (referred to in some cases as a CNN, a ConvNet, a shift invariant neural network, or a space invariant neural network), wherein the units are connected in a pattern similar to the visual cortex of the human brain. Neurons may respond to stimuli in a restricted region of space, referred to as a receptive field. Receptive fields may partially overlap, such that they collectively cover the entire (e.g., visual) field. Node responses may be calculated mathematically, such as by a convolution operation, such as using multilayer perceptrons that use minimal preprocessing. A convolutional neural network may be used for recognition within images and video streams, such as for recognizing a type of machine in a large environment using a camera system disposed on a mobile data collector, such as on a drone or mobile robot. In embodiments, a convolutional neural network may be used to provide a recommendation based on data inputs, including sensor inputs and other contextual information, such as recommending a route for a mobile data collector. In embodiments, a convolutional neural network may be used for processing inputs, such as for natural language processing of instructions provided by one or more parties involved in a workflow in an environment. In embodiments, a convolutional neural network may be deployed with a large number of neurons (e.g., 100,000, 500,000 or more), with multiple (e.g., 4, 5, 6 or more) layers, and with many (e.g., millions) of parameters. A convolutional neural net may use one or more convolutional nets.

In embodiments, methods and systems described herein that involve an expert system or self-organization capability may use a regulatory feedback network, such as for recognizing emergent phenomena (such as new types of behavior not previously understood in a transactional environment).

In embodiments, methods and systems described herein that involve an expert system or self-organization capability may use a self-organizing map (SOM), involving unsupervised learning. A set of neurons may learn to map points in an input space to coordinates in an output space. The input space may have different dimensions and topology from the output space, and the SOM may preserve these while mapping phenomena into groups.

In embodiments, methods and systems described herein that involve an expert system or self-organization capability may use a learning vector quantization neural net (LVQ). Prototypical representatives of the classes may parameterize, together with an appropriate distance measure, in a distance-based classification scheme.

In embodiments, methods and systems described herein that involve an expert system or self-organization capability may use an echo state network (ESN), which may comprise a recurrent neural network with a sparsely connected, random hidden layer. The weights of output neurons may be changed (e.g., the weights may be trained based on feedback). In embodiments, an ESN may be used to handle time series patterns, such as, in an example, recognizing a pattern of events associated with a market, such as the pattern of price changes in response to stimuli.

In embodiments, methods and systems described herein that involve an expert system or self-organization capability may use a Bi-directional, recurrent neural network (BRNN), such as using a finite sequence of values (e.g., voltage values from a sensor) to predict or label each element of the sequence based on both the past and the future context of the element. This may be done by adding the outputs of two RNNs, such as one processing the sequence from left to right, the other one from right to left. The combined outputs are the predictions of target signals, such as ones provided by a teacher or supervisor. A bi-directional RNN may be combined with a long short-term memory RNN.

In embodiments, methods and systems described herein that involve an expert system or self-organization capability may use a hierarchical RNN that connects elements in various ways to decompose hierarchical behavior, such as into useful subprograms. In embodiments, a hierarchical RNN may be used to manage one or more hierarchical templates for data collection in a transactional environment.

In embodiments, methods and systems described herein that involve an expert system or self-organization capability may use a stochastic neural network, which may introduce random variations into the network. Such random variations may be viewed as a form of statistical sampling, such as Monte Carlo sampling.

In embodiments, methods and systems described herein that involve an expert system or self-organization capability may use a genetic scale recurrent neural network. In such embodiments, an RNN (often an LSTM) is used where a series is decomposed into a number of scales where every scale informs the primary length between two consecutive points. A first order scale consists of a normal RNN, a second order consists of all points separated by two indices and so on. The Nth order RNN connects the first and last node. The outputs from all the various scales may be treated as a committee of members, and the associated scores may be used genetically for the next iteration.

In embodiments, methods and systems described herein that involve an expert system or self-organization capability may use a committee of machines (COM), comprising a collection of different neural networks that together "vote" on a given example. Because neural networks may suffer from local minima, starting with the same architecture and training, but using randomly different initial weights often gives different results. A CoM tends to stabilize the result.

In embodiments, methods and systems described herein that involve an expert system or self-organization capability may use an associative neural network (ASNN), such as involving an extension of a committee of machines that combines multiple feed forward neural networks and a k-nearest neighbor technique. It may use the correlation between ensemble responses as a measure of distance amid the analyzed cases for the kNN. This corrects the bias of the neural network ensemble. An associative neural network may have a memory that may coincide with a training set. If new data become available, the network instantly improves its predictive ability and provides data approximation (self-learns) without retraining. Another important feature of ASNN is the possibility to interpret neural network results by analysis of correlations between data cases in the space of models.

In embodiments, methods and systems described herein that involve an expert system or self-organization capability may use an instantaneously trained neural network (ITNN), where the weights of the hidden and the output layers are mapped directly from training vector data.

In embodiments, methods and systems described herein that involve an expert system or self-organization capability may use a spiking neural network, which may explicitly consider the timing of inputs. The network input and output may be represented as a series of spikes (such as a delta function or more complex shapes). SNNs may process information in the time domain (e.g., signals that vary over time, such as signals involving dynamic behavior of markets or transactional environments). They are often implemented as recurrent networks.

In embodiments, methods and systems described herein that involve an expert system or self-organization capability may use a dynamic neural network that addresses nonlinear multivariate behavior and includes learning of time-dependent behavior, such as transient phenomena and delay effects. Transients may include behavior of shifting market variables, such as prices, available quantities, available counterparties, and the like.

In embodiments, cascade correlation may be used as an architecture and supervised learning algorithm, supplementing adjustment of the weights in a network of fixed topology. Cascade-correlation may begin with a minimal network, then automatically trains, and adds new hidden units one by one, creating a multi-layer structure. Once a new hidden unit has been added to the network, its input-side weights may be frozen. This unit then becomes a permanent feature-detector in the network, available for producing outputs or for creating other, more complex feature detectors. The cascade-correlation architecture may learn quickly, determine its own size and topology, and retain the structures it has built even if the training set changes and requires no back-propagation.

In embodiments, methods and systems described herein that involve an expert system or self-organization capability may use a neuro-fuzzy network, such as involving a fuzzy inference system in the body of an artificial neural network. Depending on the type, several layers may simulate the processes involved in a fuzzy inference, such as fuzzification, inference, aggregation and defuzzification. Embedding a fuzzy system in a general structure of a neural net as the benefit of using available training methods to find the parameters of a fuzzy system.

In embodiments, methods and systems described herein that involve an expert system or self-organization capability may use a compositional pattern-producing network (CPPN), such as a variation of an associative neural network (ANN) that differs the set of activation functions and how they are applied. While typical ANNs often contain only sigmoid functions (and sometimes Gaussian functions), CPPNs may include both types of functions and many others. Furthermore, CPPNs may be applied across the entire space of possible inputs, so that they may represent a complete image. Since they are compositions of functions, CPPNs in effect encode images at infinite resolution and may be sampled for a particular display at whatever resolution is optimal.

This type of network may add new patterns without re-training. In embodiments, methods and systems described herein that involve an expert system or self-organization capability may use a one-shot associative memory network, such as by creating a specific memory structure, which assigns each new pattern to an orthogonal plane using adjacently connected hierarchical arrays.

In embodiments, methods and systems described herein that involve an expert system or self-organization capability may use a hierarchical temporal memory (HTM) neural network, such as involving the structural and algorithmic properties of the neocortex. HTM may use a biomimetic model based on memory-prediction theory. HTM may be used to discover and infer the high-level causes of observed input patterns and sequences.

Holographic Associative Memory

In embodiments, methods and systems described herein that involve an expert system or self-organization capability may use a holographic associative memory (HAM) neural network, which may comprise an analog, correlation-based, associative, stimulus-response system. Information may be mapped onto the phase orientation of complex numbers. The memory is effective for associative memory tasks, generalization and pattern recognition with changeable attention.

In embodiments, various embodiments involving network coding may be used to code transmission data among network nodes in a neural net, such as where nodes are located in one or more data collectors or machines in a transactional environment.

Integrated Circuits

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuits, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit, such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

Figure 32:
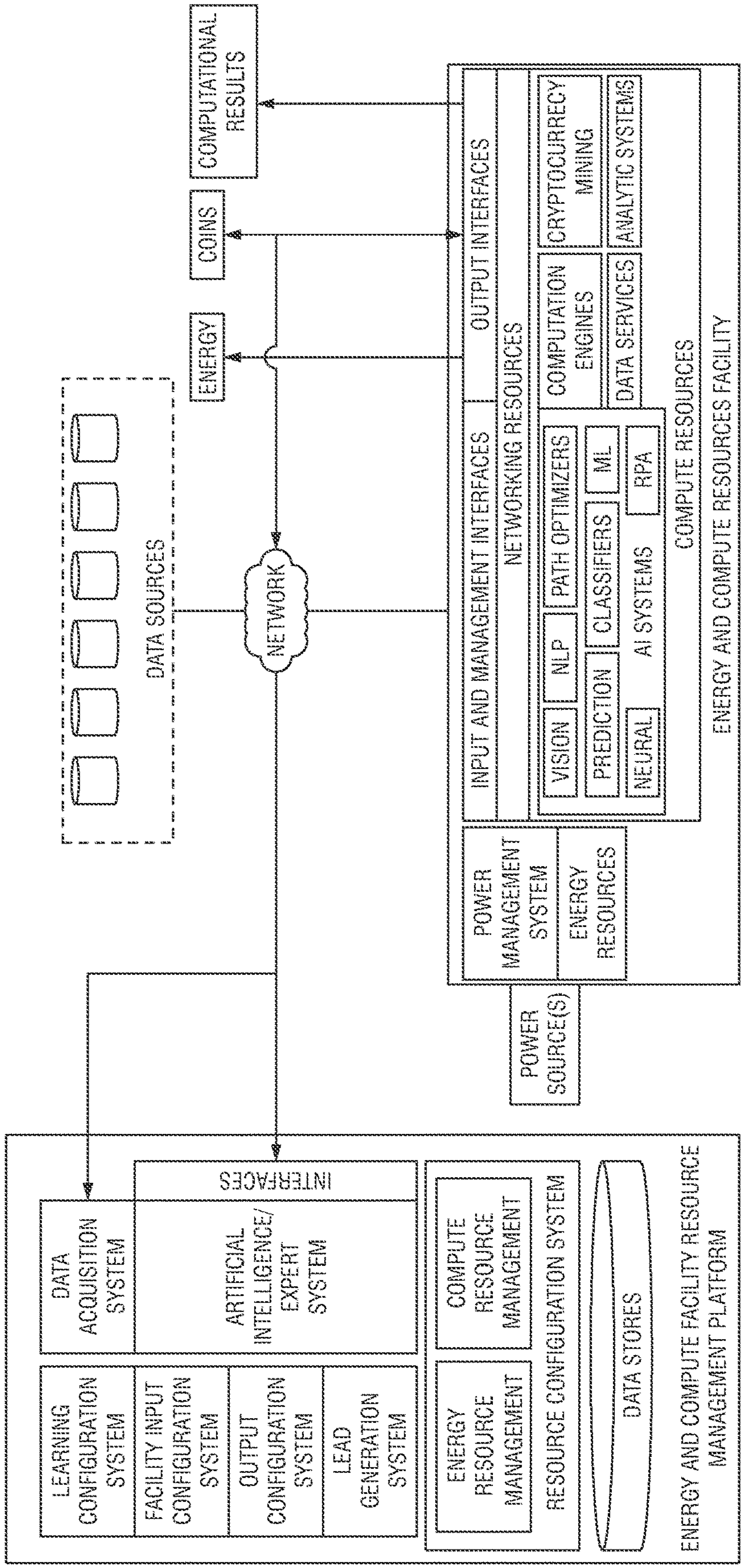
FIG. 32 is a schematic diagram of components of an environment including an intelligent energy and compute facility, a host intelligent energy and compute facility resource management platform, a set of data sources, a set of expert systems, interfaces to a set of market platforms and external resources, and a set of user or client systems and devices in accordance with embodiments of the present disclosure.

With reference to FIG. 32, the environment includes an intelligent energy and compute facility (such as a large scale facility hosting many compute resources and having access to a large energy source, such as a hydropower source), as well as a host intelligent energy and compute facility resource management platform, referred to in some cases for convenience as the energy and information technology platform (with networking, data storage, data processing and other resources as described herein), a set of data sources, a set of expert systems, interfaces to a set of market platforms and external resources, and a set of user (or client) systems and devices.

Intelligent Energy and Compute Facility

A facility may be configured to access an inexpensive (at least during some time periods) power source (such as a hydropower dam, a wind farm, a solar array, a nuclear power plant, or a grid), to contain a large set of networked information technology resources, including processing units, servers, and the like that are capable of flexible utilization (such as by switching inputs, switching configurations, switching programming, and the like), and to provide a range of outputs that can also be flexibly configured (such as passing through power to a smart grid, providing computational results (such as for cryptocurrency mining, artificial intelligence, or analytics). A facility may include a power storage system, such as for large scale storage of available power.

Intelligent Energy and Compute Facility Resource Management Platform

In operation, a user can access the energy and information technology platform to initiate and manage a set of activities that involve optimizing energy and computing resources among a diverse set of available tasks. Energy resources may include hydropower, nuclear power, wind power, solar power, grid power and the like, as well as energy storage resources, such as batteries, gravity power, and storage using thermal materials, such as molten salts. Computing resources may include GPUs, FPGAs, servers, chips, Asics, processors, data storage media, networking resources, and many others. Available tasks may include cryptocurrency hash processing, expert system processing, computer vision processing, NLP, path optimization, applications of models such as for analytics, etc.

In embodiments, the platform may include various subsystems that may be implemented as micro services, such that other subsystems of the system access the functionality of a subsystem providing a micro service via application programming interface API. In some embodiments, the various services that are provided by the subsystems may be deployed in bundles that are integrated, such as by a set of APIs. Each of the subsystems is described in greater detail with respect to FIG. 130.

The External Data Sources can include any system or device that can provide data to the platform. Examples of data sources can include market data sources (e.g., for financial markets, commercial markets (including e-commerce), advertising markets, energy markets, telecommunication markets, and many others). The energy and computing resource platform accesses external data sources via a network (e.g., the Internet) in any suitable manner (e.g., crawlers, extract-transform-load (ETL) systems, gateways, brokers, application programming interfaces (APIs), spiders, distributed database queries, and the like).

A facility is a facility that has an energy resource (e.g., a hydro power resource) and a set of compute resource (e.g., a set of flexible computing resources that can be provisioned and managed to perform computing tasks, such as GPUs, FPGAs and many others, a set of flexible networking resources that can similarly be provisioned and managed, such as by adjusting network coding protocols and parameters), and the like.

User and client systems and devices can include any system or device that may consume one or more computing or energy resource made available by the energy and computing resource platform. Examples include cryptocurrency systems (e.g., for Bitcoin and other cryptocurrency mining operations), expert and artificial intelligence systems (such as neural networks and other systems, such as for computer vision, natural language processing, path determination and optimization, pattern recognition, deep learning, supervised learning, decision support, and many others), energy management systems (such as smart grid systems), and many others. User and client systems may include user devices, such as smartphones, tablet computer devices, laptop computing devices, personal computing devices, smart televisions, gaming consoles, and the like.

Figure 130:
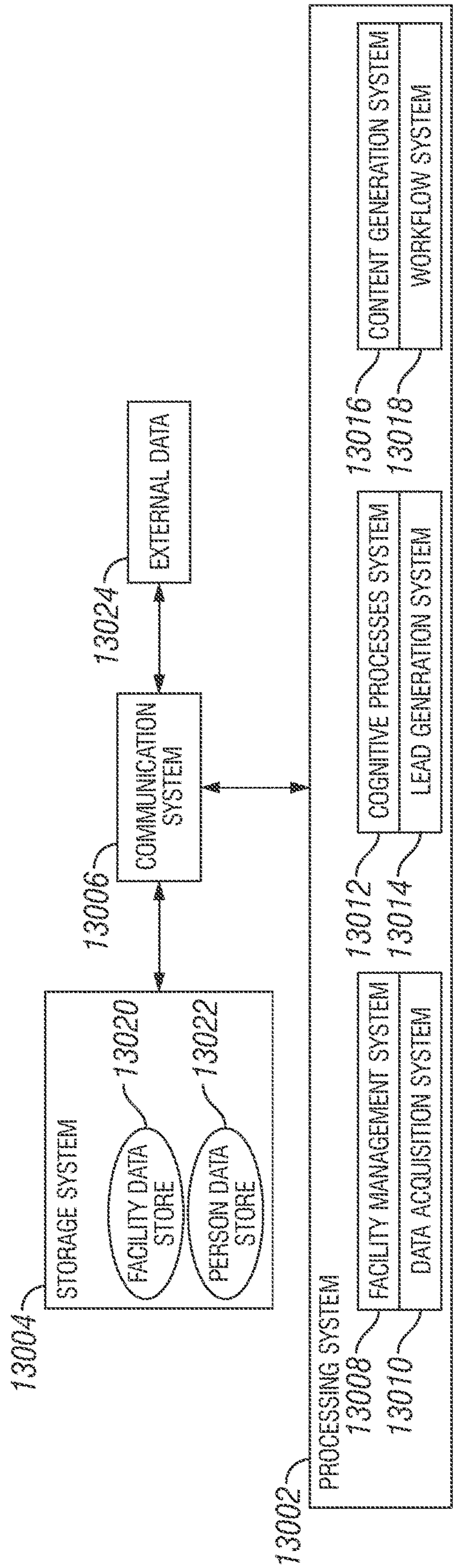
FIG. 130 depicts an example energy and computing resource platform.

Energy and Computing Resource Platform Components in FIG. 130.

FIG. 130 illustrates an example energy and computing resource platform according to some embodiments of the present disclosure. In embodiments, the energy and computing resource platform may include a processing system 13002, a storage system 13004, and a communication system 13006.

The processing system 13002 may include one or more processors and memory. The processors may operate in an individual or distributed manner. The processors may be in the same physical device or in separate devices, which may or may not be located in the same facility. The memory may store computer-executable instructions that are executed by the one or more processors. In embodiments, the processing system 13002 may execute the facility management system 13008, the data acquisition system 13010, the cognitive processes system 13012, the lead generation system 13014, the content generation system 13016, and the workflow system 13018.

The storage system 13004 may include one or more computer-readable storage mediums. The computer-readable storage mediums may be located in the same physical device or in separate devices, which may or may not be located in the same facility, which may or may not be located in the same facility. The computer-readable storage mediums may include flash devices, solid-state memory devices, hard disk drives, and the like. In embodiments, the storage system 13004 stores one or more of a facility data store 13020, a person data store 13022, and an external data store 13024.

The communication system 13006 may include one or more transceivers that are configured to effectuate wireless or wired communication with one or more external devices, including user devices and/or servers, via a network (e.g., the Internet and/or a cellular network). The communication system 13006 may implement any suitable communication protocol. For example, the communication system 13006 may implement an IEEE 801.11 wireless communication protocol and/or any suitable cellular communication protocol to effectuate wireless communication with external devices and external data stores 13024 via a wireless network.

Energy and Computing Resource Management Platform

Discovers, provisions, manages, and optimizes energy and compute resources using artificial intelligence and expert systems with sensitivity to market and other conditions by learning on a set of outcomes. Discovers and facilitates cataloging of resources, optionally by user entry and/or automated detection (including peer detection). May implement a graphical user interface to receive relevant information regarding the energy and compute resources that are available. This may include a "digital twin" of an energy and compute facility that allows modeling, prediction, and the like. May generate a set of data record that define the facility or a set of facilities under common ownership or operation by a host. The data record may have any suitable schema. In some embodiments (e.g., FIG. 131), the facility data records may include a facility identifier (e.g., a unique identifier that corresponds to the facility), a facility type (e.g., energy system and capabilities, compute systems and capabilities, networking systems and capabilities), facility attributes (e.g., name of the facility, name of the facility initiator, description of the facility, keywords of the facility, goals of the facility, timing elements, schedules, and the like), participants/potential participants in the facility (e.g., identifiers of owners, operators, hosts, service providers, consumers, clients, users, workers, and others), and any suitable metadata (e.g., creation date, launch date, scheduled requirements and the like). May generate content, such as a document, message, alert, report, webpage and/or application page based on the contents of the data record. For example, may obtain the data record of the facility and may populate a webpage template with the data contained therein. In addition, there can be management of existing facilities, updates the data record of a facility, determinations of outcomes (e.g., energy produced, compute tasks completed, processing outcomes achieved, financial outcomes achieved, service levels met and many others), and sending of information (e.g., updates, alerts, requests, instructions, and the like) to individuals and systems.

Data Acquisition Systems can acquire various types of data from different data sources and organizes that data into one or more data structures. In embodiments, the data acquisition system receives data from users via a user interface (e.g., user types in profile information). In embodiments, the data acquisition system can retrieve data from passive electronic sources. In embodiments, the data acquisition system can implement crawlers to crawl different websites or applications. In embodiments, the data acquisition system can implement an API to retrieve data from external data sources or user devices (e.g., various contact lists from user's phone or email account). In embodiments, the data acquisition system can structure the obtained data into appropriate data structures. In embodiments, the data acquisition system generates and maintains person records based on data collected regarding individuals. In embodiments, a person datastore stores person records. In some of these embodiments, the person datastore may include one or more databases, indexes, tables, and the like. Each person record may correspond to a respective individual and may be organized according to any suitable schema.

Figure 132:
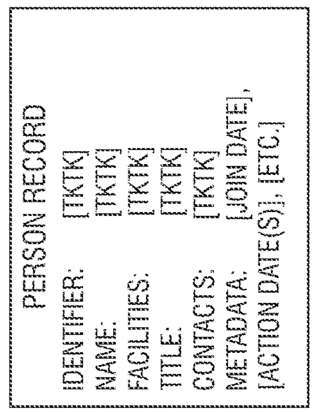
FIG. 132 depicts an example schema of a person data record.

FIG. 132 illustrates an example schema of a person record. In the example, each person record may include a unique person identifier (e.g., username or value), and may define all data relating to a person, including a person's name, facilities they are a part of or associated with (e.g., a list of facility identifiers), attributes of the person (age, location, job, company, role, skills, competencies, capabilities, education history, job history, and the like), a list of contacts or relationships of the person (e.g., in a role hierarchy or graph), and any suitable metadata (e.g., date joined, dates actions were taken, dates input was received, and the like).

In embodiments, the data acquisition system generates and maintains one or more graphs based on the retrieved data. In some embodiments, a graph datastore may store the one or more graphs. The graph may be specific to a facility or may be a global graph. The graph may be used in many different applications (e.g., identifying a set of roles, such as for authentication, for approvals, and the like for persons, or identifying system configurations, capabilities, or the like, such as hierarchies of energy producing, computing, networking, or other systems, subsystems and/or resources).

In embodiments, a graph may be stored in a graph database, where data is stored in a collection of nodes and edges. In some embodiments, a graph has nodes representing entities and edges representing relationships, each node may have a node type (also referred to as an entity type) and an entity value, each edge may have a relationship type and may define a relationship between two entities. For example, a person node may include a person ID that identifies the individual represented by the node and a company node may include a company identifier that identifies a company. A "works for" edge that is directed from a person node to a company node may denote that the person represented by the edge node works for the company represented by the company node. In another example, a person node may include a person ID that identifies the individual represented by the node and a facility node may include a facility identifier that identifies a facility. A "manages" edge that is directed from a person node to a facility node may denote that the person represented by the person node is a manager of the facility represented by the facility node. Furthermore in embodiments, an edge or node may contain or reference additional data. For example, a "manages" edge may include a function that indicates a specific function within a facility that is managed by a person. The graph(s) can be used in a number of different applications, which are discussed with respect to the cognitive processing system.

In embodiments, validated Identity information may be imported from one or more identity information providers, as well as data from LinkedIn™ and other social network sources regarding data acquisition and structuring data. In embodiments, the data acquisition system may include an identity management system (not shown in Figs) of the platform may manage identity stitching, identity resolution, identity normalization, and the like, such as determining where an individual represented across different social networking sites and email contacts is in fact the same person. In embodiments, the data acquisition system may include a profile aggregation system (not shown in Figs) that finds and aggregates disparate pieces of information to generate a comprehensive profile for a person. The profile aggregation system may also deduplicate individuals.

Cognitive Processing Systems

Figure 133:
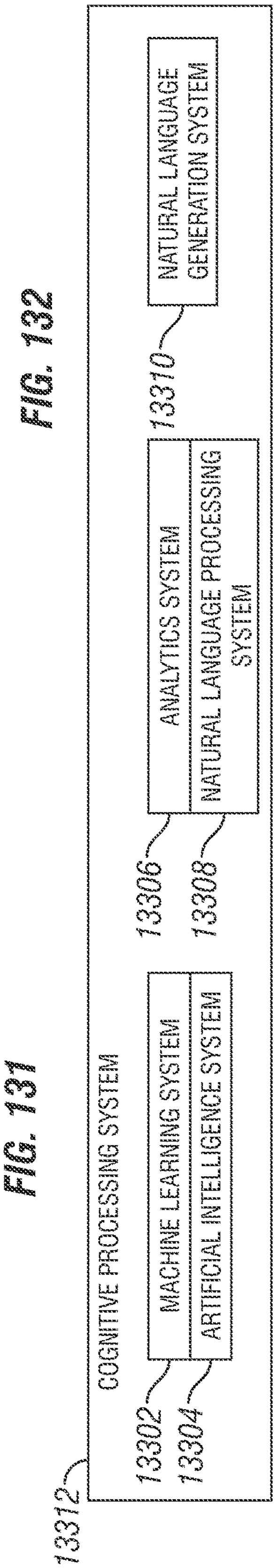
FIG. 133 depicts a cognitive processing system.

The cognitive processing system 13312 may implement one or more of machine learning processes, artificial intelligence processes, analytics processes, natural language processing processes, and natural language generation processes. FIG. 133 illustrates an example cognitive processing system according to some embodiments of the present disclosure. In this example, the cognitive processing system may include a machine learning system 13302, an artificial intelligence (AI) system 13304, an analytics system 13306, a natural language processing system 13308, and a natural language generation system 13310.

Machine Learning System

In embodiments, the machine learning system may train models, such as predictive models (e.g., various types of neural networks, regression based models, and other machine-learned models). In embodiments, training can be supervised, semi-supervised, or unsupervised. In embodiments, training can be done using training data, which may be collected or generated for training purposes.

A facility output model (or prediction model) may be a model that receive facility attributes and outputs one or more predictions regarding the production or other output of a facility. Examples of predictions may be the amount of energy a facility will produce, the amount of processing the facility will undertake, the amount of data a network will be able to transfer, the amount of data that can be stored, the price of a component, service or the like (such as supplied to or provided by a facility), a profit generated by accomplishing a given tasks, the cost entailed in performing an action, and the like. In each case, the machine learning system optionally trains a model based on training data. In embodiments, the machine learning system may receive vectors containing facility attributes (e.g., facility type, facility capability, objectives sought, constraints or rules that apply to utilization of resources or the facility, or the like), person attributes (e.g., role, components managed, and the like), and outcomes (e.g., energy produced, computing tasks completed, and financial results, among many others). Each vector corresponds to a respective outcome and the attributes of the respective facility and respective actions that led to the outcome. The machine learning system takes in the vectors and generates predictive model based thereon. In embodiments, the machine learning system may store the predictive models in the model datastore.

In embodiments, training can also be done based on feedback received by the system, which is also referred to as "reinforcement learning." In embodiments, the machine learning system may receive a set of circumstances that led to a prediction (e.g., attributes of facility, attributes of a model, and the like) and an outcome related to the facility and may update the model according to the feedback.

In embodiments, training may be provided from a training data set that is created by observing actions of a set of humans, such as facility managers managing facilities that have various capabilities and that are involved in various contexts and situations. This may include use of robotic process automation to learn on a training data set of interactions of humans with interfaces, such as graphical user interfaces, of one or more computer programs, such as dashboards, control systems, and other systems that are used to manage an energy and compute management facility.

Artificial Intelligence (AI) Systems

In embodiments, the AI system leverages the predictive models to make predictions regarding facilities. Examples of predictions include ones related to inputs to a facility (e.g., available energy, cost of energy, cost of compute resources, networking capacity and the like, as well as various market information, such as pricing information for end use markets), ones related to components or systems of a facility (including performance predictions, maintenance predictions, uptime/downtime predictions, capacity predictions and the like), ones related to functions or workflows of the facility (such as ones that involved conditions or states that may result in following one or more distinct possible paths within a workflow, a process, or the like), ones related to outputs of the facility, and others. In embodiments, the AI system receives a facility identifier. In response to the facility identifier, the AI system may retrieve attributes corresponding to the facility. In some embodiments, the AI system may obtain the facility attributes from a graph. Additionally or alternatively, the AI system may obtain the facility attributes from a facility record corresponding to the facility identifier, and the person attributes from a person record corresponding to the person identifier.

Examples of additional attributes that can be used to make predictions about a facility or a related process of system include: related facility information; owner goals (including financial goals); client goals; and many more additional or alternative attributes. In embodiments, the AI system may output scores for each possible prediction, where each prediction corresponds to a possible outcome. For example, in using a prediction model used to determine a likelihood that a hydroelectric source for a facility will produce 5 MW of power, the prediction model can output a score for a "will produce" outcome and a score for a "will not produce" outcome. The AI system may then select the outcome with the highest score as the prediction. Alternatively, the AI system may output the respective scores to a requesting system.

Clustering Systems

In embodiments, a clustering system clusters records or entities based on attributes contained herein. For example, similar facilities, resources, people, clients, or the like may be clustered. The clustering system may implement any suitable clustering algorithm. For example, when clustering people records to identify a list of customer leads corresponding to resources that can be sold by a facility, the clustering system may implement k-nearest neighbors clustering, whereby the clustering system identifies k people records that most closely relate to the attributes defined for the facility. In another example, the clustering system may implement k-means clustering, such that the clustering system identifies k different clusters of people records, whereby the clustering system or another system selects items from the cluster.

Analytics System

In embodiments, an analytics system may perform analytics relating to various aspects of the energy and computing resource platform. The analytics system may analyze certain communications to determine which configurations of a facility produce the greatest yield, what conditions tend to indicate potential faults or problems, and the like.

Lead Generation System

Figure 134:
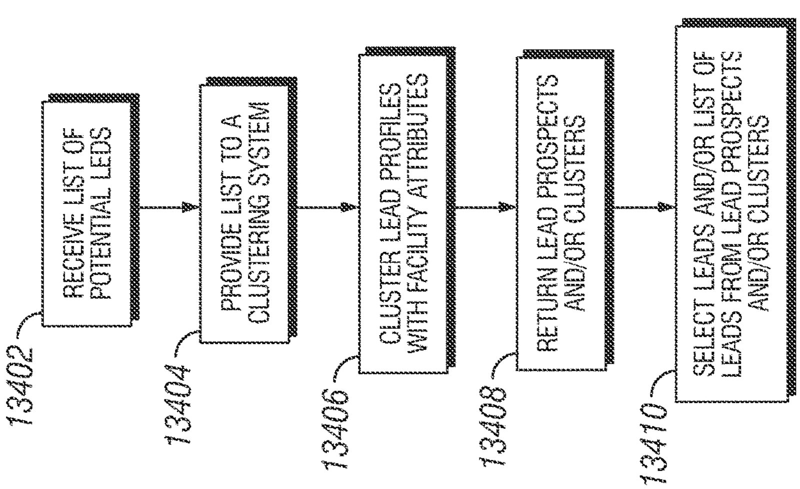
FIG. 134 depicts a process for a lead generation system to generate a lead list.

FIG. 134 shows the manner by which the lead generation system generates a lead list. Lead generation system receives a list of potential leads 13402 (such as for consumers of available products or resources). The lead generation system may provide the list of leads to the clustering system 13404. The clustering system clusters the profile of the lead with the clusters of facility attributes 13406 to identify one or more clusters. In embodiments, the clustering system returns a list of leads 13410. In other embodiments, the clustering system returns the clusters 13408, and the lead generation system selects the list of leads 13410 from the cluster to which a prospect belongs.

Figure 135:
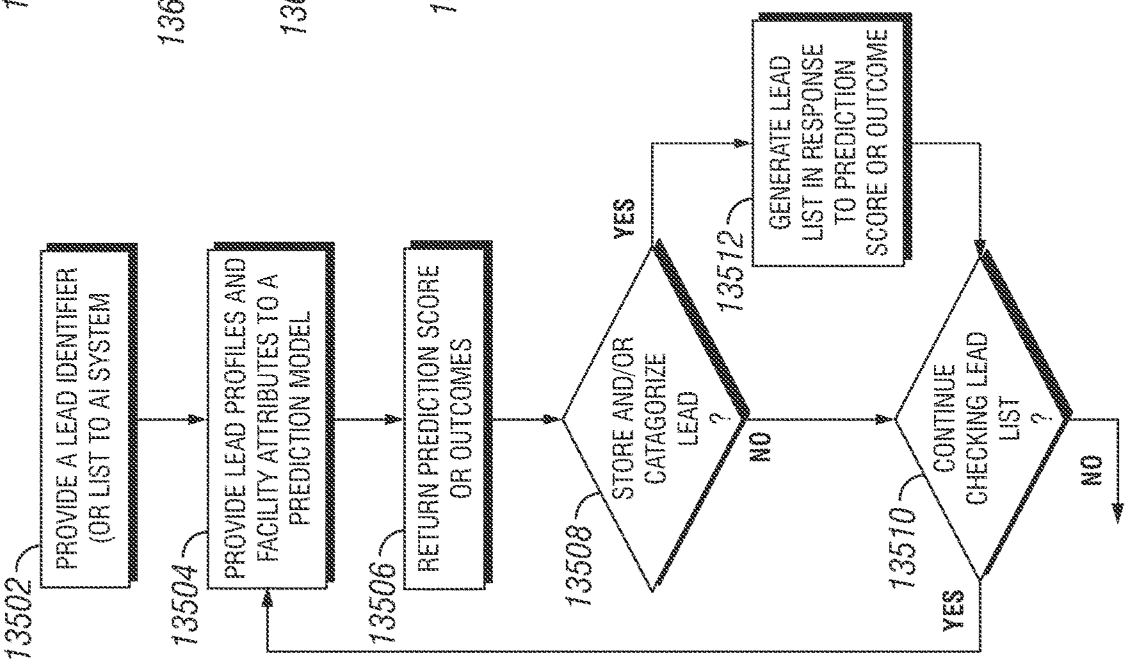
FIG. 135 depicts a process for a lead generation system to determine facility outputs for identified leads.

FIG. 135 illustrates the manner by which the lead generation system determines facility outputs for leads identified in the list of leads. In embodiments, the lead generation system provides a lead identifier of a respective lead to the AI system (step 13502). The AI system may then obtain the lead attributes of the lead and facility attributes of the facility and may feed the respective attributes into a prediction model (step 13504). The prediction model outputs a prediction, which may be scores associated with each possible outcome, or a single predicted outcome that was selected based on its respective score (e.g., the outcome having the highest score) (step 13506). The lead generation system may iterate in this manner for each lead in the lead list. For example, the lead generation system may generate leads that are consumers of compute capabilities, energy capabilities, predictions and forecasts, optimization results, and others.

In embodiments, the lead generation system categorizes the lead (step 13508) and generates a lead list (step 13512) which it provides to the facility operator or host of the systems, including an indicator of the reason why a lead may be willing to engage the facility, such as, for example, that the lead is an intensive user of computing resources, such as to forecast behavior of a complex, multi-variable market, or to mine for cryptocurrency. In embodiments, where more leads are stored and/or categorized, the lead generation system continues checking the lead list (step 13510).

Content Generation Systems

In embodiments, a content generation system of the platform generates content for a contact event, such as an email, text message, or a post to a network, or a machine-to-machine message, such as communicating via an API or a peer-to-peer system. In embodiments, the content is customized using artificial intelligence based on the attributes of the facility, attributes of a recipient (e.g., based on the profile of a person, the role of a person, or the like), and/or relating to the project or activity to which the facility relates. The content generation system may be seeded with a set of templates, which may be customized, such as by training the content generation system on a training set of data created by human writers, and which may be further trained by feedback based on outcomes tracked by the platform, such as outcomes indicating success of particular forms of communication in generating donations to a facility, as well as other indicators as noted throughout this disclosure. The content generation system may customize content based on attributes of the facility, a project, and/or one or more people, and the like. For example, a facility manager may receive short messages about events related to facility operations, including codes, acronyms, and jargon, while an outside consumer of outputs from the facility may receive a more formal report relating to the same event.

Figure 136:
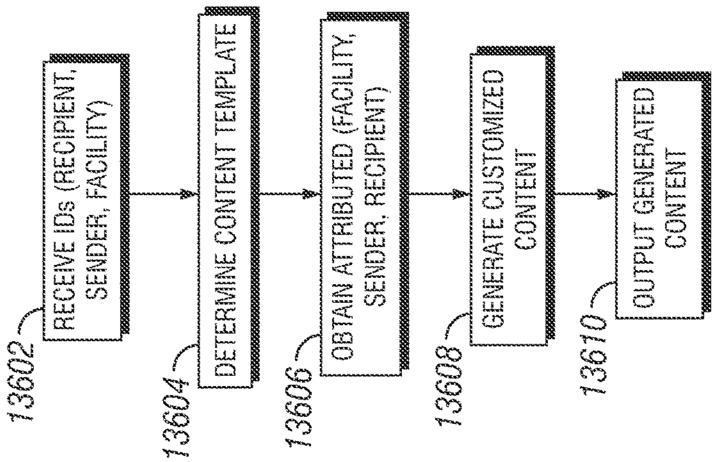
FIG. 136 depicts a process to generate and output personalized content.

FIG. 136 illustrates a manner by which the content generation system may generate personalized content. The content generation system receives a recipient id, a sender id (which may be a person or a system, among others), and a facility id (step 13602). The content generation system may determine the appropriate template (step 13604) to use based on the relationships among the recipient, sender, and facility and/or based on other considerations (e.g., a recipient who is a busy manager is more likely to respond to less formal messages or more formal messages). The content generation system may provide the template (or an identifier thereof) to the natural language generation system, along with the recipient id, the sender id, and the facility id. The natural language generation system may obtain facility attributes based on the facility id, and person attributes corresponding to the recipient or sender based on their identities (step 13606). The natural language generation system may then generate the personalized or customized content (step 13608) based on the selected template, the facility parameters, and/or other attributes of the various types described herein. The natural language generation system may output the generated content (step 13610) to the content generation system.

In embodiments, a person, such as a facility manager, may approve the generated content provided by the content generation system and/or make edits to the generated content, then send the content, such as via email and/or other channels. In embodiments, the platform tracks the contact event.

Figure 137:
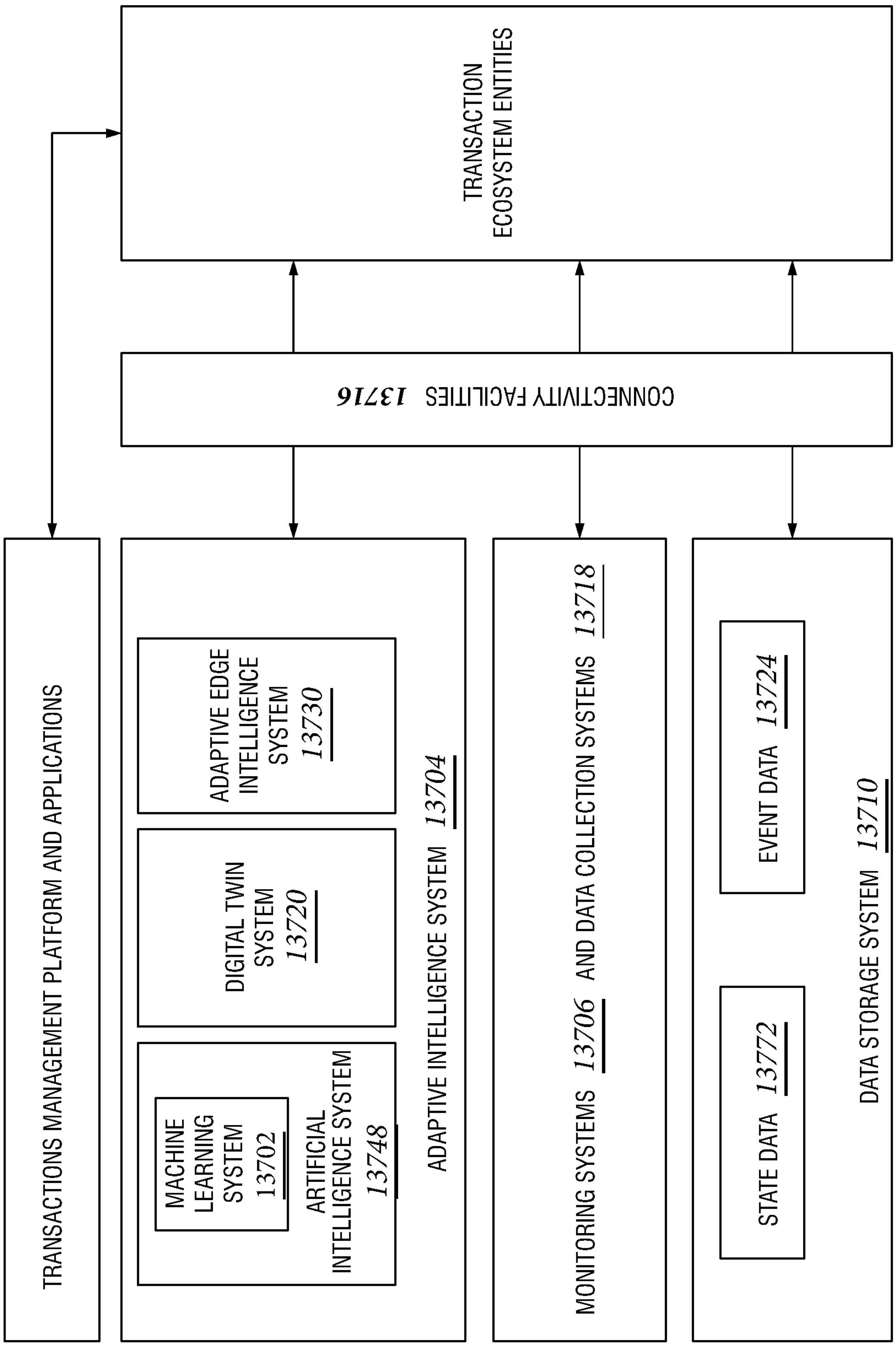
FIG. 137 depicts a schematic illustrating an example of a portion of an information technology system for transaction artificial intelligence leveraging digital twins according to some embodiments of the present disclosure.

Referring to FIG. 137, an adaptive intelligence system 13704 may include an artificial intelligence system 13748, a digital twin system 13720, and an adaptive device (or edge) intelligence system 13730. The artificial intelligence system 13748 may define a machine learning model 13702 for performing analytics, simulation, decision making, and prediction making related to data processing, data analysis, simulation creation, and simulation analysis of one or more of the transaction entities. The machine learning model 13702 is an algorithm and/or statistical model that performs specific tasks without using explicit instructions, relying instead on patterns and inference. The machine learning model 13702 builds one or more mathematical models based on training data to make predictions and/or decisions without being explicitly programmed to perform the specific tasks. The machine learning model 13702 may receive inputs of sensor data as training data, including event data 13724 and state data 13772 related to one or more of the transaction entities through data collection systems 13718 and monitoring systems 13706 and connectivity facilities 13716. The event data 13724 and state data 13772 may be stored in a data storage system 13710 The sensor data input to the machine learning model 13702 may be used to train the machine learning model 13702 to perform the analytics, simulation, decision making, and prediction making relating to the data processing, data analysis, simulation creation, and simulation analysis of the one or more of the transaction entities. The machine learning model 13702 may also use input data from a user or users of the information technology system. The machine learning model 13702 may include an artificial neural network, a decision tree, a support vector machine, a Bayesian network, a genetic algorithm, any other suitable form of machine learning model, or a combination thereof. The machine learning model 13702 may be configured to learn through supervised learning, unsupervised learning, reinforcement learning, self-learning, feature learning, sparse dictionary learning, anomaly detection, association rules, a combination thereof, or any other suitable algorithm for learning.

The artificial intelligence system 13748 may also define the digital twin system 13720 to create a digital replica of one or more of the transaction entities. The digital replica of the one or more of the transaction entities may use substantially real-time sensor data to provide for substantially real-time virtual representation of the transaction entity and provides for simulation of one or more possible future states of the one or more transaction entities. The digital replica exists simultaneously with the one or more transaction entities being replicated. The digital replica provides one or more simulations of both physical elements and properties of the one or more transaction entities being replicated and the dynamics thereof, in embodiments, throughout the lifestyle of the one or more transaction entities being replicated. The digital replica may provide a hypothetical simulation of the one or more transaction entities, for example during a design phase before the one or more transaction entities are constructed or fabricated, or during or after construction or fabrication of the one or more transaction entities by allowing for hypothetical extrapolation of sensor data to simulate a state of the one or more transaction entities, such as during high stress, after a period of time has passed during which component wear may be an issue, during maximum throughput operation, after one or more hypothetical or planned improvements have been made to the one or more transaction entities, or any other suitable hypothetical situation. In some embodiments, the machine learning model 13702 may automatically predict hypothetical situations for simulation with the digital replica, such as by predicting possible improvements to the one or more transaction entities, predicting when one or more components of the one or more transaction entities may fail, and/or suggesting possible improvements to the one or more transaction entities, such as changes to timing settings, arrangement, components, or any other suitable change to the transaction entities. The digital replica allows for simulation of the one or more transaction entities during both design and operation phases of the one or more transaction entities, as well as simulation of hypothetical operation conditions and configurations of the one or more transaction entities. The digital replica allows for invaluable analysis and simulation of the one or more transaction entities, by facilitating observation and measurement of nearly any type of metric, including temperature, wear, light, vibration, etc. not only in, on, and around each component of the one or more transaction entities, but in some embodiments within the one or more transaction entities. In some embodiments, the machine learning model 13702 may process the sensor data including the event data 13724 and the state data 13772 to define simulation data for use by the digital twin system 13720. The machine learning model 13702 may, for example, receive state data 13772 and event data 13724 related to a particular transaction entity of the plurality of transaction entities and perform a series of operations on the state data 13772 and the event data 13724 to format the state data 13772 and the event data 13724 into a format suitable for use by the digital twin system 13720 in creation of a digital replica of the transaction entity. For example, one or more transaction entities may include a robot configured to augment products on an adjacent assembly line. The machine learning model 13702 may collect data from one or more sensors positioned on, near, in, and/or around the robot. The machine learning model 13702 may perform operations on the sensor data to process the sensor data into simulation data and output the simulation data to the digital twin system 13720. The digital twin system 13720 simulation may use the simulation data to create one or more digital replicas of the robot, the simulation including for example metrics including temperature, wear, speed, rotation, and vibration of the robot and components thereof. The simulation may be a substantially real-time simulation, allowing for a human user of the information technology to view the simulation of the robot, metrics related thereto, and metrics related to components thereof, in substantially real time. The simulation may be a predictive or hypothetical situation, allowing for a human user of the information technology to view a predictive or hypothetical simulation of the robot, metrics related thereto, and metrics related to components thereof.

In some embodiments, the machine learning model 13702 and the digital twin system 13720 may process sensor data and create a digital replica of a set of transaction entities of the plurality of transaction entities to facilitate design, real-time simulation, predictive simulation, and/or hypothetical simulation of a related group of transaction entities. The digital replica of the set of transaction entities may use substantially real-time sensor data to provide for substantially real-time virtual representation of the set of transaction entities and provide for simulation of one or more possible future states of the set of transaction entities. The digital replica exists simultaneously with the set of transaction entities being replicated. The digital replica provides one or more simulations of both physical elements and properties of the set of transaction entities being replicated and the dynamics thereof, in embodiments, throughout the lifestyle of the set of transaction entities being replicated. The one or more simulations may include a visual simulation, such as a wire-frame virtual representation of the one or more transaction entities that may be viewable on a monitor, using an augmented reality (AR) apparatus, or using a virtual reality (VR) apparatus. The visual simulation may be able to be manipulated by a human user of the information technology system, such as zooming or highlighting components of the simulation and/or providing an exploded view of the one or more transaction entities. The digital replica may provide a hypothetical simulation of the set of transaction entities, for example during a design phase before the one or more transaction entities are constructed or fabricated, or during or after construction or fabrication of the one or more transaction entities by allowing for hypothetical extrapolation of sensor data to simulate a state of the set of transaction entities, such as during high stress, after a period of time has passed during which component wear may be an issue, during maximum throughput operation, after one or more hypothetical or planned improvements have been made to the set of transaction entities, or any other suitable hypothetical situation. In some embodiments, the machine learning model 13702 may automatically predict hypothetical situations for simulation with the digital replica, such as by predicting possible improvements to the set of transaction entities, predicting when one or more components of the set of transaction entities may fail, and/or suggesting possible improvements to the set of transaction entities, such as changes to timing settings, arrangement, components, or any other suitable change to the transaction entities. The digital replica allows for simulation of the set of transaction entities during both design and operation phases of the set of transaction entities, as well as simulation of hypothetical operation conditions and configurations of the set of transaction entities. The digital replica allows for invaluable analysis and simulation of the one or more transaction entities, by facilitating observation and measurement of nearly any type of metric, including temperature, wear, light, vibration, etc. not only in, on, and around each component of the set of transaction entities, but in some embodiments within the set of transaction entities. In some embodiments, the machine learning model 13702 may process the sensor data including the event data 13724 and the state data 13772 to define simulation data for use by the digital twin system 13720. The machine learning model 13702 may, for example, receive state data 13772 and event data 13724 related to a particular transaction entity of the plurality of transaction entities and perform a series of operations on the state data 13772 and the event data 13724 to format the state data 13772 and the event data 13724 into a format suitable for use by the digital twin system 13720 in the creation of a digital replica of the set of transaction entities. For example, a set of transaction entities may include a die machine configured to place products on a conveyor belt, the conveyor belt on which the die machine is configured to place the products, and a plurality of robots configured to add parts to the products as they move along the assembly line. The machine learning model 13702 may collect data from one or more sensors positioned on, near, in, and/or around each of the die machines, the conveyor belt, and the plurality of robots. The machine learning model 13702 may perform operations on the sensor data to process the sensor data into simulation data and output the simulation data to the digital twin system 13720. The digital twin system 13720 simulation may use the simulation data to create one or more digital replicas of the die machine, the conveyor belt, and the plurality of robots, the simulation including for example metrics including temperature, wear, speed, rotation, and vibration of the die machine, the conveyor belt, and the plurality of robots and components thereof. The simulation may be a substantially real-time simulation, allowing for a human user of the information technology to view the simulation of the die machine, the conveyor belt, and the plurality of robots, metrics related thereto, and metrics related to components thereof, in substantially real time. The simulation may be a predictive or hypothetical situation, allowing for a human user of the information technology to view a predictive or hypothetical simulation of the die machine, the conveyor belt, and the plurality of robots, metrics related thereto, and metrics related to components thereof.

In some embodiments, the machine learning model 13702 may prioritize collection of sensor data for use in digital replica simulations of one or more of the transaction entities. The machine learning model 13702 may use sensor data and user inputs to train, thereby learning which types of sensor data are most effective for creation of digital replicate simulations of one or more of the transaction entities. For example, the machine learning model 13702 may find that a particular transaction entity has dynamic properties such as component wear and throughput affected by temperature, humidity, and load. The machine learning model 13702 may, through machine learning, prioritize collection of sensor data related to temperature, humidity, and load, and may prioritize processing sensor data of the prioritized type into simulation data for output to the digital twin system 13720. In some embodiments, the machine learning model 13702 may suggest to a user of the information technology system that more and/or different sensors of the prioritized type be implemented in the information technology near and around the transaction entity being simulation such that more and/or better data of the prioritized type may be used in simulation of the transaction entity via the digital replica thereof.

In some embodiments, the machine learning model 13702 may be configured to learn to determine which types of sensor data are to be processed into simulation data for transmission to the digital twin system 13720 based on one or both of a modeling goal and a quality or type of sensor data. A modeling goal may be an objective set by a user of the information technology system or may be predicted or learned by the machine learning model 13702. Examples of modeling goals include creating a digital replica capable of showing dynamics of throughput on an assembly line, which may include collection, simulation, and modeling of, e.g., thermal, electrical power, component wear, and other metrics of a conveyor belt, an assembly machine, one or more products, and other components of the transaction ecosystem. The machine learning model 137102 may be configured to learn to determine which types of sensor data are necessary to be processed into simulation data for transmission to the digital twin system 13720 to achieve such a model. In some embodiments, the machine learning model 13702 may analyze which types of sensor data are being collected, the quality and quantity of the sensor data being collected, and what the sensor data being collected represents, and may make decisions, predictions, analyses, and/or determinations related to which types of sensor data are and/or are not relevant to achieving the modeling goal and may make decisions, predictions, analyses, and/or determinations to prioritize, improve, and/or achieve the quality and quantity of sensor data being processed into simulation data for use by the digital twin system 13720 in achieving the modeling goal.

In some embodiments, a user of the information technology system may input a modeling goal into the machine learning model 13702. The machine learning model 13702 may learn to analyze training data to output suggestions to the user of the information technology system regarding which types of sensor data are most relevant to achieving the modeling goal, such as one or more types of sensors positioned in, on, or near a transaction entity or a plurality of transaction entities that is relevant to the achievement of the modeling goal is and/or are not sufficient for achieving the modeling goal, and how a different configuration of the types of sensors, such as by adding, removing, or repositioning sensors, may better facilitate achievement of the modeling goal by the machine learning model 13702 and the digital twin system 13720. In some embodiments, the machine learning model 13702 may automatically increase or decrease collection rates, processing, storage, sampling rates, bandwidth allocation, bitrates, and other attributes of sensor data collection to achieve or better achieve the modeling goal. In some embodiments, the machine learning model 13702 may make suggestions or predictions to a user of the information technology system related to increasing or decreasing collection rates, processing, storage, sampling rates, bandwidth allocation, bitrates, and other attributes of sensor data collection to achieve or better achieve the modeling goal. In some embodiments, the machine learning model 13702 may use sensor data, simulation data, previous, current, and/or future digital replica simulations of one or more transaction entities of the plurality of transaction entities to automatically create and/or propose modeling goals. In some embodiments, modeling goals automatically created by the machine learning model 13702 may be automatically implemented by the machine learning model 13702. In some embodiments, modeling goals automatically created by the machine learning model 13702 may be proposed to a user of the information technology system, and implemented only after acceptance and/or partial acceptance by the user, such as after modifications are made to the proposed modeling goal by the user.

In some embodiments, the user may input the one or more modeling goals, for example, by inputting one or more modeling commands to the information technology system. The one or more modeling commands may include, for example, a command for the machine learning model 13702 and the digital twin system 13720 to create a digital replica simulation of one transaction entity or a set of transaction entities, may include a command for the digital replica simulation to be one or more of a real-time simulation, and a hypothetical simulation. The modeling command may also include, for example, parameters for what types of sensor data should be used, sampling rates for the sensor data, and other parameters for the sensor data used in the one or more digital replica simulations. In some embodiments, the machine learning model 13702 may be configured to predict modeling commands, such as by using previous modeling commands as training data. The machine learning model 13702 may propose predicted modeling commands to a user of the information technology system, for example, to facilitate simulation of one or more of the transaction entities that may be useful for the management of the transaction entities and/or to allow the user to easily identify potential issues with or possible improvements to the transaction entities. The system of FIG. 137 may include a transactions management platform and applications.

In some embodiments, the machine learning model 13702 may be configured to evaluate a set of hypothetical simulations of one or more of the transaction entities. The set of hypothetical simulations may be created by the machine learning model 13702 and the digital twin system 13720 as a result of one or more modeling commands, as a result of one or more modeling goals, one or more modeling commands, by prediction by the machine learning model 13702, or a combination thereof. The machine learning model 13702 may evaluate the set of hypothetical simulations based on one or more metrics defined by the user, one or more metrics defined by the machine learning model 13702, or a combination thereof. In some embodiments, the machine learning model 13702 may evaluate each of the hypothetical simulations of the set of hypothetical simulations independently of one another. In some embodiments, the machine learning model 13702 may evaluate one or more of the hypothetical simulations of the set of hypothetical simulations in relation to one another, for example by ranking the hypothetical simulations or creating tiers of the hypothetical simulations based on one or more metrics.

In some embodiments, the machine learning model 13702 may include one or more model interpretability systems to facilitate human understanding of outputs of the machine learning model 13702, as well as information and insight related to cognition and processes of the machine learning model 13702, i.e., the one or more model interpretability systems allow for human understanding of not only "what" the machine learning model 13702 is outputting, but also "why" the machine learning model 13702 is outputting the outputs thereof, and what process led to the machine learning models 13702 formulating the outputs. The one or more model interpretability systems may also be used by a human user to improve and guide training of the machine learning model 13702, to help debug the machine learning model 13702, to help recognize bias in the machine learning model 13702. The one or more model interpretability systems may include one or more of linear regression, logistic regression, a generalized linear model (GLM), a generalized additive model (GAM), a decision tree, a decision rule, RuleFit, Naive Bayes Classifier, a K-nearest neighbors algorithm, a partial dependence plot, individual conditional expectation (ICE), an accumulated local effects (ALE) plot, feature interaction, permutation feature importance, a global surrogate model, a local surrogate (LIME) model, scoped rules, i.e., anchors, Shapley values, Shapley additive explanations (SHAP), feature visualization, network dissection, or any other suitable machine learning interpretability implementation. In some embodiments, the one or more model interpretability systems may include a model dataset visualization system. The model dataset visualization system is configured to automatically provide to a human user of the information technology system visual analysis related to distribution of values of the sensor data, the simulation data, and data nodes of the machine learning model 13702.

In some embodiments, the machine learning model 13702 may include and/or implement an embedded model interpretability system, such as a Bayesian case model (BCM) or glass box. The Bayesian case model uses Bayesian case-based reasoning, prototype classification, and clustering to facilitate human understanding of data such as the sensor data, the simulation data, and data nodes of the machine learning model 13702. In some embodiments, the model interpretability system may include and/or implement a glass box interpretability method, such as a Gaussian process, to facilitate human understanding of data such as the sensor data, the simulation data, and data nodes of the machine learning model 13702.

In some embodiments, the machine learning model 13702 may include and/or implement testing with concept activation vectors (TCAV). The TCAV allows the machine learning model 13702 to learn human-interpretable concepts, such as "running," "not running," "powered," "not powered," "robot," "human," "truck," or "ship" from examples by a process including defining the concept, determining concept activation vectors, and calculating directional derivatives. By learning human-interpretable concepts, objects, states, etc., TCAV may allow the machine learning model 13702 to output useful information related to the transaction entities and data collected therefrom in a format that is readily understood by a human user of the information technology system.

In some embodiments, the machine learning model 13702 may be and/or include an artificial neural network, e.g. a connectionist system configured to "learn" to perform tasks by considering examples and without being explicitly programmed with task-specific rules. The machine learning model 13702 may be based on a collection of connected units and/or nodes that may act like artificial neurons that may in some ways emulate neurons in a biological brain. The units and/or nodes may each have one or more connections to other units and/or nodes. The units and/or nodes may be configured to transmit information, e.g. one or more signals, to other units and/or nodes, process signals received from other units and/or nodes, and forward processed signals to other units and/or nodes. One or more of the units and/or nodes and connections therebetween may have one or more numerical "weights" assigned. The assigned weights may be configured to facilitate learning, i.e., training, of the machine learning model 13702. The weights assigned weights may increase and/or decrease one or more signals between one or more units and/or nodes, and in some embodiments may have one or more thresholds associated with one or more of the weights. The one or more thresholds may be configured such that a signal is only sent between one or more units and/or nodes if a signal and/or aggregate signal crosses the threshold. In some embodiments, the units and/or nodes may be assigned to a plurality of layers, each of the layers having one or both of inputs and outputs. A first layer may be configured to receive training data, transform at least a portion of the training data, and transmit signals related to the training data and transformation thereof to a second layer. A final layer may be configured to output an estimate, conclusion, product, or other consequence of processing of one or more inputs by the machine learning model 13702. Each of the layers may perform one or more types of transformations, and one or more signals may pass through one or more of the layers one or more times. In some embodiments, the machine learning model 13702 may employ deep learning and being at least partially modeled and/or configured as a deep neural network, a deep belief network, a recurrent neural network, and/or a convolutional neural network, such as by being configured to include one or more hidden layers.

In some embodiments, the machine learning model 13702 may be and/or include a decision tree, e.g. a tree-based predictive model configured to identify one or more observations and determine one or more conclusions based on an input. The observations may be modeled as one or more "branches" of the decision tree, and the conclusions may be modeled as one or more "leaves" of the decision tree. In some embodiments, the decision tree may be a classification tree. the classification tree may include one or more leaves representing one or more class labels, and one or more branches representing one or more conjunctions of features configured to lead to the class labels. In some embodiments, the decision tree may be a regression tree. The regression tree may be configured such that one or more target variables may take continuous values.

In some embodiments, the machine learning model 13702 may be and/or include a support vector machine, e.g. a set of related supervised learning methods configured for use in one or both of classification and regression-based modeling of data. The support vector machine may be configured to predict whether a new example falls into one or more categories, the one or more categories being configured during training of the support vector machine.

In some embodiments, the machine learning model 13702 may be configured to perform regression analysis to determine and/or estimate a relationship between one or more inputs and one or more features of the one or more inputs. Regression analysis may include linear regression, wherein the machine learning model 13702 may calculate a single line to best fit input data according to one or more mathematical criteria.

In embodiments, inputs to the machine learning model 13702 (such as a regression model, Bayesian network, supervised model, or other type of model) may be tested, such as by using a set of testing data that is independent from the data set used for the creation and/or training of the machine learning model, such as to test the impact of various inputs to the accuracy of the model 13702. For example, inputs to the regression model may be removed, including single inputs, pairs of inputs, triplets, and the like, to determine whether the absence of inputs creates a material degradation of the success of the model 13702. This may assist with recognition of inputs that are in fact correlated (e.g., are linear combinations of the same underlying data), that are overlapping, or the like. Comparison of model success may help select among alternative input data sets that provide similar information, such as to identify the inputs (among several similar ones) that generate the least "noise" in the model, that provide the most impact on model effectiveness for the lowest cost, or the like. Thus, input variation and testing of the impact of input variation on model effectiveness may be used to prune or enhance model performance for any of the machine learning systems described throughout this disclosure.

In some embodiments, the machine learning model 13702 may be and/or include a Bayesian network. The Bayesian network may be a probabilistic graphical model configured to represent a set of random variables and conditional independence of the set of random variables. The Bayesian network may be configured to represent the random variables and conditional independence via a directed acyclic graph. The Bayesian network may include one or both of a dynamic Bayesian network and an influence diagram.

In some embodiments, the machine learning model 13702 may be defined via supervised learning, i.e., one or more algorithms configured to build a mathematical model of a set of training data containing one or more inputs and desired outputs. The training data may consist of a set of training examples, each of the training examples having one or more inputs and desired outputs, i.e., a supervisory signal. Each of the training examples may be represented in the machine learning model 13702 by an array and/or a vector, i.e., a feature vector. The training data may be represented in the machine learning model 13702 by a matrix. The machine learning model 13702 may learn one or more functions via iterative optimization of an objective function, thereby learning to predict an output associated with new inputs. Once optimized, the objective function may provide the machine learning model 13702 with the ability to accurately determine an output for inputs other than inputs included in the training data. In some embodiments, the machine learning model 13702 may be defined via one or more supervised learning algorithms such as active learning, statistical classification, regression analysis, and similarity learning. Active learning may include interactively querying, by the machine learning model 13702, a user and/or an information source to label new data points with desired outputs. Statistical classification may include identifying, by the machine learning model 13702, to which a set of subcategories, i.e., subpopulations, a new observation belongs based on a training set of data containing observations having known categories. Regression analysis may include estimating, by the machine learning model 13702 relationships between a dependent variable, i.e., an outcome variable, and one or more independent variables, i.e., predictors, covariates, and/or features. Similarity learning may include learning, by the machine learning model 13702, from examples using a similarity function, the similarity function being designed to measure how similar or related two objects are.

In some embodiments, the machine learning model 13702 may be defined via unsupervised learning, i.e., one or more algorithms configured to build a mathematical model of a set of data containing only inputs by finding structure in the data such as grouping or clustering of data points. In some embodiments, the machine learning model 13702 may learn from test data, i.e., training data, that has not been labeled, classified, or categorized. The unsupervised learning algorithm may include identifying, by the machine learning model 13702, commonalities in the training data and learning by reacting based on the presence or absence of the identified commonalities in new pieces of data. In some embodiments, the machine learning model 13702 may generate one or more probability density functions. In some embodiments, the machine learning model 13702 may learn by performing cluster analysis, such as by assigning a set of observations into subsets, i.e., clusters, according to one or more predesignated criteria, such as according to a similarity metric of which internal compactness, separation, estimated density, and/or graph connectivity are factors.

In some embodiments, the machine learning model 13702 may be defined via semi-supervised learning, i.e., one or more algorithms using training data wherein some training examples may be missing training labels. The semi-supervised learning may be weakly supervised learning, wherein the training labels may be noisy, limited, and/or imprecise. The noisy, limited, and/or imprecise training labels may be cheaper and/or less labor intensive to produce, thus allowing the machine learning model 13702 to train on a larger set of training data for less cost and/or labor.

In some embodiments, the machine learning model 13702 may be defined via reinforcement learning, such as one or more algorithms using dynamic programming techniques such that the machine learning model 13702 may train by taking actions in an environment in order to maximize a cumulative reward. In some embodiments, the training data is represented as a Markov Decision Process.

In some embodiments, the machine learning model 13702 may be defined via self-learning, wherein the machine learning model 13702 is configured to train using training data with no external rewards and no external teaching, such as by employing a Crossbar Adaptive Array (CAA). The CAA may compute decisions about actions and/or emotions about consequence situations in a crossbar fashion, thereby driving teaching of the machine learning model 13702 by interactions between cognition and emotion.

In some embodiments, the machine learning model 13702 may be defined via feature learning, i.e., one or more algorithms designed to discover increasingly accurate and/or apt representations of one or more inputs provided during training, e.g. training data. Feature learning may include training via principal component analysis and/or cluster analysis. Feature learning algorithms may include attempting, by the machine learning model 13702, to preserve input training data while also transforming the input training data such that the transformed input training data is useful. In some embodiments, the machine learning model 13702 may be configured to transform the input training data prior to performing one or more classifications and/or predictions of the input training data. Thus, the machine learning model 13702 may be configured to reconstruct input training data from one or more unknown data-generating distributions without necessarily conforming to implausible configurations of the input training data according to the distributions. In some embodiments, the feature learning algorithm may be performed by the machine learning model 13702 in a supervised, unsupervised, or semi-supervised manner.

In some embodiments, the machine learning model 13702 may be defined via anomaly detection, i.e., by identifying rare and/or outlier instances of one or more items, events and/or observations. The rare and/or outlier instances may be identified by the instances differing significantly from patterns and/or properties of a majority of the training data. Unsupervised anomaly detection may include detecting of anomalies, by the machine learning model 13702, in an unlabeled training data set under an assumption that a majority of the training data is "normal." Supervised anomaly detection may include training on a data set wherein at least a portion of the training data has been labeled as "normal" and/or "abnormal."

In some embodiments, the machine learning model 13702 may be defined via robot learning. Robot learning may include generation, by the machine learning model 13702, of one or more curricula, the curricula being sequences of learning experiences, and cumulatively acquiring new skills via exploration guided by the machine learning model 13702 and social interaction with humans by the machine learning model 13702. Acquisition of new skills may be facilitated by one or more guidance mechanisms such as active learning, maturation, motor synergies, and/or imitation.

In some embodiments, the machine learning model 13702 can be defined via association rule learning. Association rule learning may include discovering relationships, by the machine learning model 13702, between variables in databases, in order to identify strong rules using some measure of "interestingness." Association rule learning may include identifying, learning, and/or evolving rules to store, manipulate and/or apply knowledge. The machine learning model 13702 may be configured to learn by identifying and/or utilizing a set of relational rules, the relational rules collectively representing knowledge captured by the machine learning model 13702. Association rule learning may include one or more of learning classifier systems, inductive logic programming, and artificial immune systems. Learning classifier systems are algorithms that may combine a discovery component, such as one or more genetic algorithms, with a learning component, such as one or more algorithms for supervised learning, reinforcement learning, or unsupervised learning. Inductive logic programming may include rule-learning, by the machine learning model 13702, using logic programming to represent one or more of input examples, background knowledge, and hypothesis determined by the machine learning model 13702 during training. The machine learning model 13702 may be configured to derive a hypothesized logic program entailing all positive examples given an encoding of known background knowledge and a set of examples represented as a logical database of facts.

Figure 138:
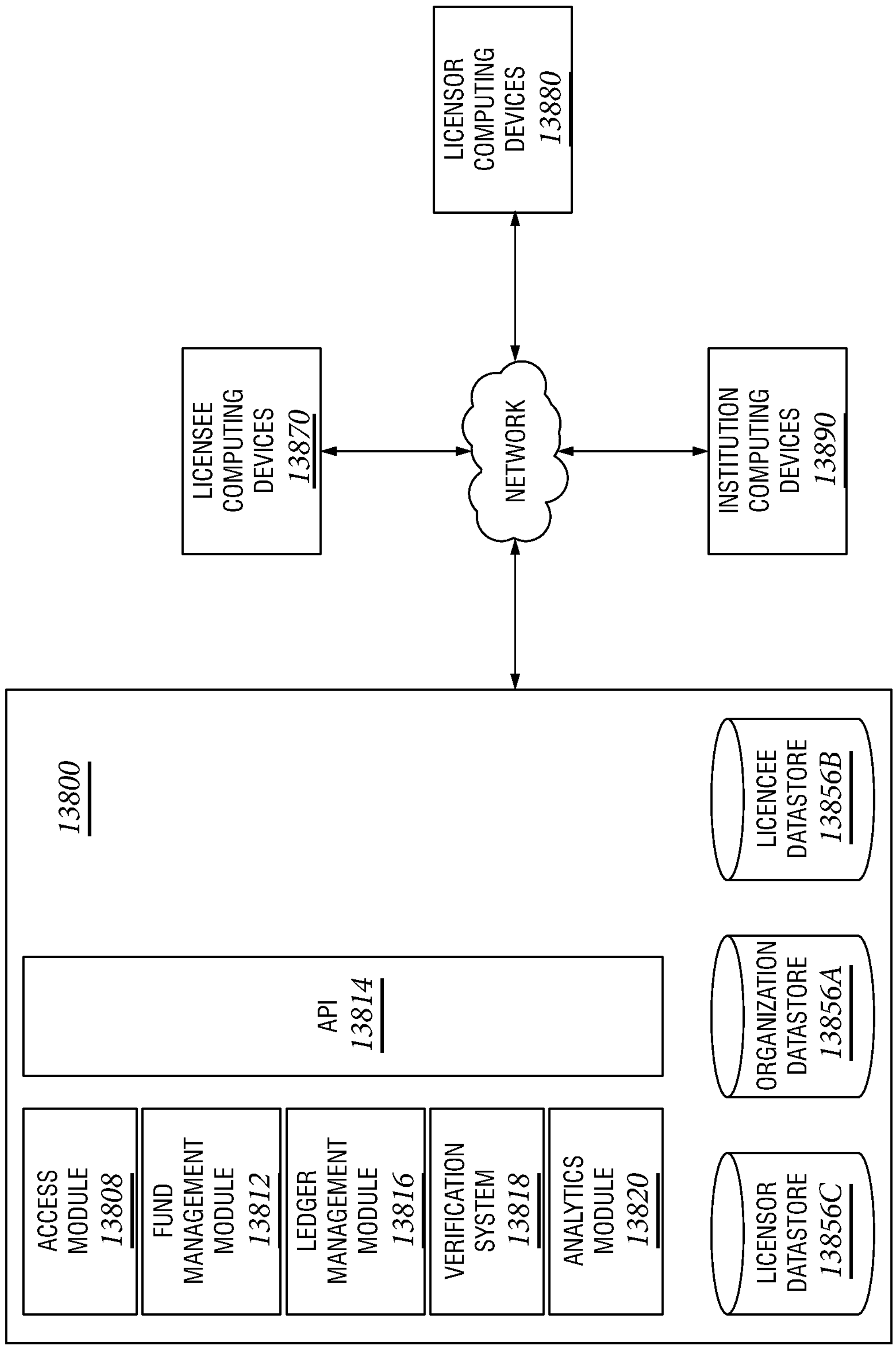
FIG. 138 depicts a schematic illustrating a compliance system that facilitates the licensing of personality rights according to some embodiments of the present disclosure.

Referring to FIG. 138, a compliance system 13800 that facilitates the licensing of personality rights using a distributed ledger and cryptocurrency is depicted. As used herein, personality rights may refer to an entity's ability to control the use of his, her, or its identity for commercial purposes. The term entity, as used herein, may refer to an individual or an organization (e.g., a university, a school, a team, a corporation, or the like) that agrees to license its personality rights, unless context suggests otherwise. This may include an entity's ability to control the use of its name, image, likeness, voice, or the like. For example, an individual exercising their personality rights for commercial purposes may include appearing in a commercial, television show, or movie, making a sponsored social media post (e.g., Instagram post, Facebook post, Twitter tweet, or the like), having their name appear on clothing (e.g., a jersey, t-shirts, sweatshirts, or the like) or other goods, appearing in a video game, or the like. In embodiments, individuals may refer to student athletes or professional athletes, but may include other classes of individuals as well. While the current description makes reference to the NCAA, the system may be used to monitor and facilitate transactions relating to other individuals and organizations. For example, the system may be used in the context of professional sports, where organizations may use sponsorships and other licensing deals to circumvent salary caps or other league rules (e.g., FIFA fair play rules).

In embodiments, the compliance system 13800 maintains one or more digital ledgers that record transactions relating to the licensing of personality rights of entities. In embodiments, a digital ledger may be a distributed ledger that is distributed amongst a set of computing devices 13870, 13880, 13890 (also referred to as nodes) and/or may be encrypted. Put another way, each participating node may store a copy of the distributed ledger. An example of the digital ledger is a Blockchain ledger. In some embodiments, a distributed ledger is stored across a set of public nodes. In other embodiments, a distributed ledger is stored across a set of whitelisted participant nodes (e.g., on the servers of participating universities or teams). In some embodiments, the digital ledger is privately maintained by the compliance system 13800. The latter configuration provides a more energy efficient means of maintaining a digital ledger; while the former configurations (e.g., distributed ledgers) provide a more secure/verifiable means of maintaining a digital ledger.

In embodiments, a distributed ledger may store tokens. The tokens may be cryptocurrency tokens that are transferrable to licensors and licensees. In some embodiments, a distributed ledger may store the ownership data of each token. A token (or a portion thereof) may be owned by the compliance system, the governing organization (e.g., the NCAA), a licensor, a licensee, a team, an institution, an individual or the like. In embodiments, the distributed ledger may store event records. Event records may store information relating to events associated with the entities involved with the compliance system. For example, an event record may record an agreement entered into by two parties, the completion of an obligation by a licensor, the distribution of funds to a licensor from a license, the non-completion of an obligation by a licensor, the distribution of funds to entities associated with the licensee (e.g., teammates, institution, team, etc.), and the like.

In embodiments, the digital ledger may store smart contracts that govern agreements between licensors and licensees. As used herein, a licensee may be an organization or person that wishes to enter an agreement to license a licensor's personality rights. Examples of licensees may include, but are not limited to, a car dealership that wants a star student athlete to appear in a print ad, a company that wants the likeness of a licensor (e.g., an athlete and/or a team) to appear in a commercial, a video game maker that wants to use team names, team apparel, player names and/or numbers in a video game, a shoe maker that wants an athlete to endorse a sneaker, a television show producer that wants an athlete to appear in the television show, or the like. In embodiments, the compliance system 13800 generates a smart contract that memorializes an agreement between the individual and a licensee and facilitates the transfer of consideration (e.g., money) when the parties agree that the individual has performed his or her requirements as put forth in the agreement. For example, an athlete may agree to appear in a commercial on behalf of a local car dealership. The smart contract in this example may include an identifier of the athlete (e.g., an individual ID and/or an individual account ID), an identifier of the organization (e.g., an organization ID and/or an organization account ID), the requirements of the individual (e.g., to appear in a commercial, to make a sponsored social media post, to appear at an autograph signing, or the like), and the consideration (e.g., a monetary amount). In embodiments, the smart contract may include additional terms. In embodiments, the additional terms may include an allocation rule that defines a manner by which the consideration is allocated to the athlete and one or more other parties (e.g., agent, manager, university, team, teammates, or the like). For example, in the context of a student athlete, a smart contract may define a split between the licensing athlete, the athletic department of the student athlete's university, and the student athlete's teammates. In a specific example, a university may have a policy that requires a player appearing in any advertisement to split the funds according to a 60/20/20 split, whereby 60% of the funds are allocated to the student athlete appearing in the commercial, 20% of the funds are allocated to the athletic department, and 20% of the funds are allocated to the student athlete's teammates. When a smart contract verifies that the athlete has performed his or her duties with respect to the smart contract (e.g., appeared for the commercial), the smart contract can transfer the agreed upon amount from an account of the licensee to an account of the athlete and accounts of any other entities that may be allocated a percentage of the funds in the smart contract (e.g., athletic department and teammates).

In embodiments, the compliance system 13800 utilizes cryptocurrency to facilitate the transfer of funds. In embodiments, the cryptocurrency is mined by participant nodes and/or generated by the compliance system. The cryptocurrency can be an established type of cryptocurrency (e.g., Bitcoin, Ethereum, Litecoin, or the like) or may be a proprietary cryptocurrency. In some embodiments, the cryptocurrency is a pegged cryptocurrency that is pegged to a particular fiat currency (e.g., pegged to the US dollar. British Pound, Euro, or the like). For example, a single unit of cryptocurrency (also referred to as a "coin") may be pegged to a single unit of fiat currency (e.g., a US dollar). In embodiments, a licensee may exchange fiat currency for a corresponding amount of cryptocurrency. For example, if the cryptocurrency is pegged to the dollar, the licensee may exchange an amount of US dollars for a corresponding amount of cryptocurrency. In embodiments, the compliance system 13800 may keep a percentage of the real-world currency as a transaction fee (e.g., 5%). For example, in exchanging $10,000, the compliance system 13800 may distribute $9,500 dollars' worth of cryptocurrency to an account of the licensee and may keep the $5,000 dollars as a transaction fee. Once the cryptocurrency is deposited in an account of a licensee, the licensee may enter into transactions with individuals.

In embodiments, the compliance system 13800 may allow organizations to create smart contract templates that define one or more conditions/restrictions on the contract. For example, an organization may predefine the allocation between the licensee, the organization, and any other individuals (e.g., coaches, teammates, representatives). Additionally or alternatively, the organization may place minimum and/or maximum amounts of agreements. Additionally or alternatively, the organization may place restrictions on when an agreement can be entered into and/or performed. For example, players may be restricted from appearing in commercials or advertisements during the season and/or during exam periods. These details may be stored in an organization datastore 13856A Organizations may place other conditions/restrictions in a smart contract. In these embodiments, an individual and licensee wishing to enter to an agreement must use a smart contract template provided by the organization to which the individual belongs. In other words, the compliance system 13800 may only allow an individual that has an active relationship with an organization (e.g., plays on a team of a university) to participate in a smart contract if the smart contract is defined by or otherwise approved by the organization.

In embodiments, the compliance system 13800 manages a clearinghouse process that approves potential licensees. Before a licensee can participate in agreements facilitated by the compliance system 13800, the licensee can provide information relating to the licensee. This may include a tax ID number, an entity name, incorporation information (e.g., state and type), a list of key personnel (e.g., directors, executives, board members, approved decision makers, and/or the like), and any other suitable information. In embodiments, the potential licensee may be required to sign (e.g., eSign or wet ink signature) a document indicating that the organization will not willingly use the compliance system 13800 to circumvent any rules, laws, or regulations (e.g., they will not circumvent NCAA regulations). In embodiments, the compliance system 13800 or another entity (e.g., the NCAA) may verify the licensee. Once verified, the information is stored in a licensee datastore 13856B and the licensee may participate in transactions.

In embodiments, the compliance system 13800 may create accounts for licensors once they have joined an organization (e.g., signed an athletic scholarship with a university). Once a licensor is verified as being affiliated with the organization, the compliance system 13800 may create an account for the licensor and may create a relationship between the individual and the organization, whereby the licensor may be required to use smart contracts that are approved or provided by the organization. Should the licensor join another organization (e.g., transfers to another school), the compliance system 13800 may sever the relationship with the previous organization and may create a new relationship with the other organization. Similarly, once a licensor is no longer affiliated with any organization (e.g., the player graduates, enters a professional league, retires, or the like), the compliance system 13800 may prevent the licensor from participating in transactions on the compliance system 13800.

In embodiments, the compliance system 13800 may provide a graphical user interface that allows users to create smart contracts governing personality rights licenses. In these embodiments, the compliance system allows a user (e.g., a licensor) to select a smart contract template. In some embodiments, the compliance system 13800 may restrict the user to only select a smart contract template that is associated with an institution of the licensor. In embodiments, the graphical user interface allows a user to define certain terms (e.g., the type or types of obligations placed on the licensor, an amount of funds to paid, a date by which the obligations of the licensor must be completed by, a location at which the obligation is completed, and/or other suitable terms). Upon a user providing input for parameterizing a smart contract template, the compliance system 13800 may generate a smart contract by parameterizing one or more variables in the smart contract with the provided input. Upon parameterizing an instance of a smart contract, the compliance system 13800 may deploy the smart contract. In some embodiments, the compliance system 13800 may deploy the smart contract by broadcasting the parameterized smart contract to the participant nodes, which in turn may update each respective instance of the distributed ledger with the new smart contract. In some embodiments, an institution of the licensor must approve the parameterized smart contract before the parameterized smart contract may be deployed to the distributed ledger.

In embodiments, the compliance system 13800 may provide a graphical user interface to verify performance of an obligation by a licensor. In some of these embodiments, the compliance system 13800 may include an application that is accessed by licensors, that allows a licensor to prove that he or she performed an obligation. In some of these embodiments, the application may allow a user to record locations that the licensor went to (e.g., locations of film or photo shoots), to upload records (e.g., screen shots of social media posts) or to provide other corroborating evidence that the licensor has performed his or her obligations with respect to a licensing transaction. In this way, the licensor can prove that he or she performed the tasks required by the licensing deal. In some embodiments, the application may interact with a wearable device or may capture other digital exhaust, such as social media posts of the user (e.g., licensor) to collect evidence that supports or disproves a licensor's claim that he or she performed the obligations under the transaction agreement. In embodiments, the corroborating evidence collected by the application may be recorded by the application and stored on the distributed ledger as a licensor datastore 13856C.

In embodiments, the compliance system 13800 (or a smart contract issued in connection with the compliance system 13800) may complete transactions pertaining to a smart contract governing the licensing of the personality rights of a licensor upon verification that licensor has performed his or her obligations defined in the agreement. As mentioned, the licensor may use an application to provide evidence of satisfaction of the obligations of the agreement. Additionally or alternatively, the licensee may provide verification that the licensor has performed his or her obligations (e.g., using an application). In embodiments, the smart contract governing the agreement may receive verification that the licensor has performed his or her obligations defined by the agreement. In response the smart contract may release (or initiate the release of) the cryptocurrency amount defined in the smart contract. The cryptocurrency amount may be distributed to the accounts of the licensor and any other parties defined in the agreement (e.g., teammates of the licensor, the program of the licensor, the regulating body, or the like).

In embodiments, the compliance system 13800 is configured to perform analytics and provide reports to a regulatory body and/or other entities (e.g., the other organizations). In these embodiments, the analytics may be used to identify individuals that are potentially circumventing the rules and regulations of the regulatory body. Furthermore, in some embodiments, transaction records may be maintained on a distributed ledger, whereby different organizations may be able to view agreements entered into by individuals affiliated with other organizations such that added levels of transparency and oversight may disincentivize individuals, organizations, and/or licensees from circumventing rules and regulations.

In embodiments, the compliance system 13800 may train and/or leverage machine-learned models to identify potential instances of circumvention of rules or regulations. In these embodiments, the compliance system 13800 may train machine-learned models using outcome data. Examples of outcome data may include data relating to a set of transactions where an organization (e.g., a team or university), licensee (e.g., a company), and/or licensor (e.g., an athlete) were determined to be circumventing rules or regulations and data relating to a set of transactions where an organization, licensee, and/or licensor were found to be in compliance with the rules and regulations. Examples of machine-learned models include neural networks, regression-based models, decisions trees, random forests, Hidden Markov Models, Bayesian Models, and the like. In embodiments, the compliance system 13800 may leverage a machine-learned model by obtaining a set of records relating to transactions a licensee, a licensor, and/or an organization (e.g., a team or university) from the distributed ledger. The compliance system may extract relevant features, such as the amount paid to a particular licensor by a licensee, amounts paid to other licensors on other teams, affiliations of the licensor, amounts paid to a licensor by other licensees, and the like, and may feed the features to the machine-learned model. The machine-learned model may issue a score that indicates a likelihood that the transaction was legitimate (or illegitimate) based on the extracted features. In embodiments, the compliance system 13800 may provide notifications to relevant parties (e.g., regulators) when the output of a machine-learned model indicates that a transaction was likely illegitimate.

Figure 139:
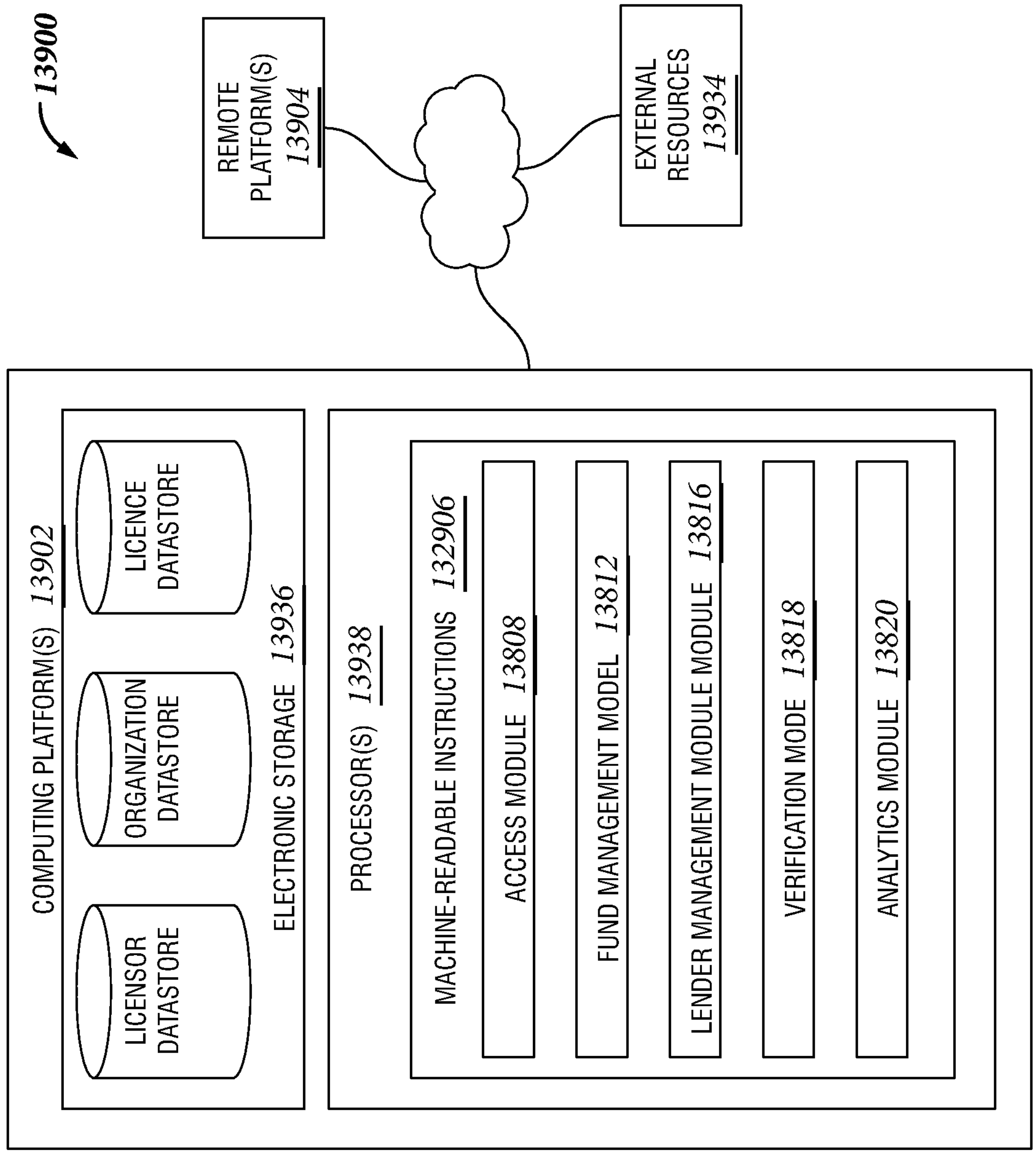
FIG. 139 depicts a schematic illustrating an example set of components of a compliance system according to some embodiments of the present disclosure.

FIG. 139 illustrates an example system 13900 configured for electronically facilitating licensing of one or more personality rights of a licensor, in accordance with some embodiments of the present disclosure. In some embodiments, the system 13900 may include one or more computing platforms 13902. Computing platform(s) 13902 may be configured to communicate with one or more remote platforms 13904 according to a client/server architecture, a peer-to-peer architecture, and/or other architectures. Remote platform(s) 13904 may be configured to communicate with other remote platforms via computing platform(s) 13902 and/or according to a client/server architecture, a peer-to-peer architecture, and/or other architectures. Users may access system 13900 via remote platform(s) 13904.

In embodiments, computing platform(s) 13902 may be configured by machine-readable instructions 13906. Machine-readable instructions 13906 may include one or more instruction modules. The instruction modules may include computer program modules. The instruction modules may include one or more of an access module 13108, a fund management module 13112, a ledger management module 13116, a verification module 13118, an analytics module 13120, and/or other instruction modules.

In embodiments, the access module 13108 may be configured to receive an access request from a licensee to obtain approval to license personality rights from a set of available licensors. In embodiments, the access module 13108 may be configured to selectively grant access to the licensee based on the access request. For example, the access module 13108 may receive a name of a potential licensee (e.g., corporate name), a list of principals (e.g., executives and/or owners) of the potential licensee, a location of the licensee, affiliations of the licensee and the principals thereof, and the like. In embodiments, the access module 13108 may provide this information to a human that grants access and/or may feed this information into an artificial intelligence system that vets potential licensees. In embodiments, the access module 13108 is configured to selectively grant access to a licensor by verifying that the licensee is permitted to engage with a set of licensors including the licensor based on the set of affiliations. Selectively granting access to the licensor may include, in response to verifying that the licensee is permitted to engage with the set of licensors, granting the licensee approval to engage with the set of licensees. The set of affiliations of the licensee may include organizations to which the licensee or a principal associated with the licensee donates to or owns.

In embodiments, the fund management module 13112 may be configured to receive confirmation of a deposit of an amount of funds from the licensee. In some embodiments, the fund management module 13112 may be configured to issue an amount of cryptocurrency corresponding to the amount of funds deposited by the licensee to an account of the licensee. In embodiments, the fund management module 13112 may be configured to escrow the consideration amount of cryptocurrency from the account of the licensee until the funds are released by a smart contract.

In embodiments, the ledger management module 13116 may be configured to receive a smart contract request to create a smart contract governing the licensing of the one or more personality rights of the licensor by the licensee. In embodiments, the ledger management module 13116 may be configured to generate the smart contract based on the smart contract request. The smart contract may be generated using a smart contract template provided by an interested third party (e.g., a university, a governing body, or the like) and by one or more parameters provided by a user (e.g., the licensor, the team of the licensor, an institution, and/or licensee) By way of non-limiting example, the interested third party may be one of a university, a sports team, or a collegiate athletics governance organization. The smart contract request may indicate one or more terms including a consideration amount of cryptocurrency to be paid to the licensor in exchange for one or more obligations on the licensor. In embodiments, the ledger management module 13116 may be configured to deploy the smart contract to a distributed ledger. The distributed ledger may be auditable by a set of third parties, including the interested third party. The distributed ledger may be a public ledger. The distributed ledger may be a private ledger that is only hosted on computing devices associated with interested third parties. In embodiments, the distributed ledger may be a blockchain.

In embodiments, the verification module 13118 may be configured to verify that the licensor has performed the one or more obligation. In some embodiments, verifying that a licensor has performed the one or more obligations may include receiving location data from a wearable device associated with the licensor and verifying that the licensor has performed the one or more obligations based on the location data, whereby the location may be used to show that the licensor was at a particular location at a particular time (e.g., a photoshoot or a filming). In embodiments, verifying that the licensor may have performed the one or more obligations includes receiving social media data from a social media website and verifying that the licensor has performed the one or more obligations based on the social media data, whereby the social media data may be used to show that the licensor has made a required social media posting. In embodiments, verifying that the licensor may have performed the one or more obligations includes receiving media content from an external data source and verifying that the licensor has performed the one or more obligations based on the media content, whereby a licensor and/or licensee may upload the media content to prove that the licensor has appeared in the media content. By way of non-limiting example, the media content may be one of a video, a photograph, or an audio recording. In embodiments, the verification module 13118 may generate and output an event record to the participating nodes upon verifying that a licensor has performed its obligations. In embodiments, the verification module 13118 may generate and output an event record to the participating nodes that indicates that the compliance system 13100 has received corroborating evidence (e.g., social media data, location data, and/or media contents) that show that the licensor has performed his or her obligations. In embodiments, the verification module 13118 may be configured to output an event record indicating completion of a licensing transaction defined by the smart contract to the distributed ledger.

In embodiments, the verification module 13118 may be configured to verify, by the smart contract, that the licensor has performed the one or more obligations. In embodiments, the verification module 13118 and/or a smart contract may be configured to, in response to receiving verification that the licensor has performed the one or more obligations, release at least a portion of the consideration amount of cryptocurrency into a licensor account of the licensor. Releasing the at least a portion of the consideration amount of cryptocurrency into a licensee account of the licensee may include identifying an allocation smart contract associated with the licensee and distributing the consideration amount of the cryptocurrency in accordance with the allocation rules. By way of non-limiting example, the additional entities may include one or more of teammates of the licensor, coaches of the licensor, a team of the licensor, a university of the licensee, and a governing body (e.g., the NCAA).

In embodiments, an analytics module 13120 may be configured to obtain a set of records indicating completion of a set of respective transactions from the distributed ledger. The set of records may include the record indicating the completion of the transaction defined by the smart contract. In embodiments, the analytics module 13120 may be configured to determine whether an organization associated with the licensor is likely in violation of one or more regulations based on the set of records and a fraud detection model. The fraud detection model may be trained using training data that indicates permissible transactions and fraudulent transactions.

In some implementations, the allocation smart contract may define allocation rules governing a manner by which funds resulting from licensing the one or more personality rights are to be distributed amongst the licensor and one or more additional entities.

In some implementations, by way of non-limiting example, the regulations may be provided by one of NCAA, FIFA, NBA, MLB, NFL, MLS, NHL, and the like.

In some implementations, computing platform(s) 13902, remote platform(s) 13904, and/or external resources 13934 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 13902, remote platform(s) 13904, and/or external resources 13934 may be operatively linked via some other communication media.

A given remote platform 13904 may include one or more processors configured to execute computer program modules. The computer program modules may be configured to enable an expert or user associated with the given remote platform 13904 to interface with compliance system 13100 and/or external resources 13934, and/or provide other functionality attributed herein to remote platform(s). 13904. By way of non-limiting example, a given remote platform 13904 and/or a given computing platform 13902 may include one or more of a server, a desktop computer, a laptop computer, a handheld computer, a tablet computing platform, a Netbook, a Smartphone, a gaming console, and/or other computing platforms.

External resources 13934 may include sources of information outside of compliance system 13100, external entities participating with compliance system 13100, and/or other resources. In some implementations, some or all of the functionality attributed herein to external resources 13934 may be provided by resources included in compliance system 13100.

Computing platform(s) 202 may include electronic storage 13936, one or more processors 13938, and/or other components. Computing platform(s) 1202 may include communication lines, or ports to enable the exchange of information with a network and/or other computing platforms. Illustration of computing platform(s) 13902 in FIG. 139 is not intended to be limiting. Computing platform(s) 13902 may include a plurality of hardware, software, and/or firmware components operating together to provide the functionality attributed herein to computing platform(s) 13902. For example, computing platform(s) 13902 may be implemented by a cloud of computing platforms operating together as computing platform(s) 13902.

Electronic storage 13936 may comprise non-transitory storage media that electronically stores information. The electronic storage media of electronic storage 13936 may include one or both of system storage that is provided integrally (i.e., substantially non-removable) with computing platform(s) 13902 and/or removable storage that is removably connectable to computing platform(s) 13902 via, for example, a port (e.g., a USB port, a firewire port, etc.) or a drive (e.g., a disk drive, etc.). Electronic storage 13936 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 13936 may include one or more virtual storage resources (e.g., cloud storage, a virtual private network, and/or other virtual storage resources). Electronic storage 13936 may store software algorithms, information determined by processor(s) 13938, information received from computing platform(s) 13902, information received from remote platform(s) 13904, and/or other information that enables computing platform(s) 13902 to function as described herein.

Processor(s) 13938 may be configured to provide information processing capabilities in computing platform(s) 13902. As such, processor(s) 13938 may include one or more of a digital processor, an analog processor, a digital circuit designed to process information, an analog circuit designed to process information, a state machine, and/or other mechanisms for electronically processing information. Although processor(s) 13938 is shown in FIG. 139 as a single entity, this is for illustrative purposes only. In some implementations, processor(s) 13938 may include a plurality of processing units. These processing units may be physically located within the same device, or processor(s) 13938 may represent processing functionality of a plurality of devices operating in coordination. Processor(s) 13938 may be configured to execute modules 13108, 13112, 13116, 13118, 13120, and/or other modules. Processor(s) 13938 may be configured to execute modules 13108, 13112, 13116, 13118, 13120, and/or other modules by software; hardware; firmware; some combination of software, hardware, and/or firmware; and/or other mechanisms for configuring processing capabilities on processor(s) 13938. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 13108, 13112, 13116, 13118, and 13120 are illustrated in FIG. 139 as being implemented within a single processing unit, in implementations in which processor(s) 13938 includes multiple processing units, one or more of modules 13108, 13112, 13116, 13118, and 13120 may be implemented remotely from the other modules. The description of the functionality provided by the different modules 13108, 13112, 13116, 13118, and 13120 described below is for illustrative purposes, and is not intended to be limiting, as any of modules 13108, 13112, 13116, 13118, and/or 13120 may provide more or less functionality than is described. For example, one or more of modules 13108, 13112, 13116, 13118, and/or 13120 may be eliminated, and some or all of its functionality may be provided by other ones of modules 13108, 13112, 13116, 13118, and/or 13120. As another example, processor(s) 13938 may be configured to execute one or more additional modules that may perform some or all of the functionality attributed below to one of modules 13108, 13112, 13116, 13118, and/or 13120.

Figure 140:
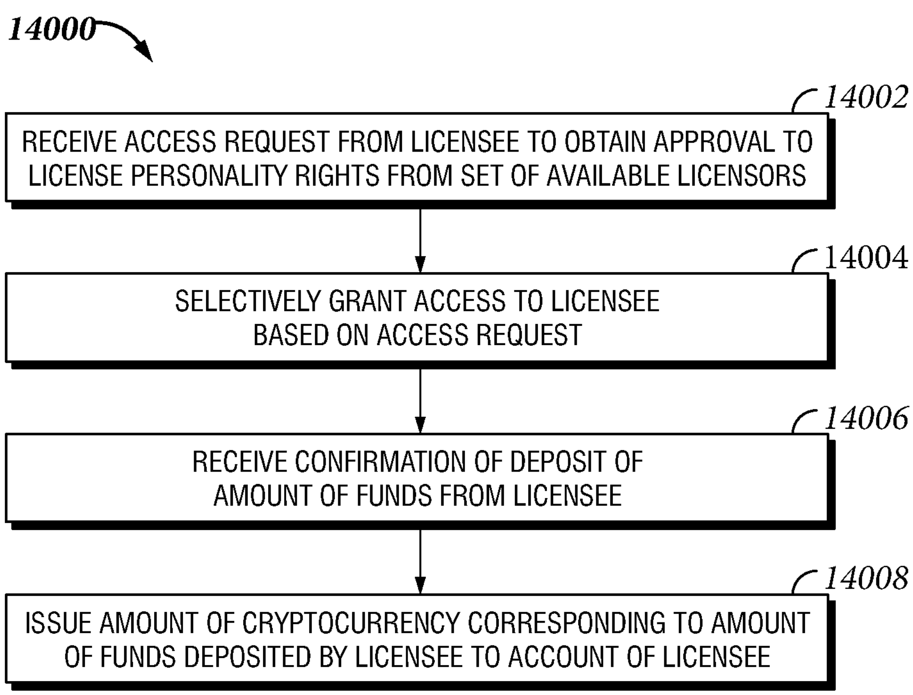
FIG. 140 depicts a set of operations of a method for vetting a potential licensee for purposes of licensing personality rights of a licensor according to some embodiments of the present disclosure.

FIGS. 140 and/or 141 illustrates an example method 14000 for electronically facilitating licensing of one or more personality rights of a licensor, in accordance with some embodiments of the present disclosure. The operations of method 14000 presented below are intended to be illustrative. In some embodiments, method 14000 may be accomplished with one or more additional operations not described, and/or without one or more of the operations discussed. Additionally, the order in which the operations of method 14000 are illustrated in FIGS. 140 and/or 141 and described below is not intended to be limiting.

In some implementations, method 14000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 14000 in response to instructions stored electronically on an electronic storage medium. The one or more processing devices may include one or more devices configured through hardware, firmware, and/or software to be specifically designed for execution of one or more of the operations of method 14000.

FIG. 140 illustrates method 14000, in accordance with one or more implementations of the present disclosure.

At 14002, the method includes receiving an access request from a licensee to obtain approval to license personality rights from a set of available licensors. Operation 14002 may be performed by one or more hardware processors configured by machine-readable instructions including a module that is the same as or similar to access module 13108, in accordance with one or more implementations.

At 14004, the method includes selectively granting access to the licensee based on the access request. Operation 14004 may be performed by one or more hardware processors configured by machine-readable instructions including a module that is the same as or similar to access module 13108, in accordance with one or more implementations.

At 14006, the method includes receiving confirmation of a deposit of an amount of funds from the licensee. Operation 14006 may be performed by one or more hardware processors configured by machine-readable instructions including a module that is the same as or similar to fund management module 13112, in accordance with one or more implementations.

At 14008, the method includes issuing an amount of cryptocurrency corresponding to the amount of funds deposited by the licensee to an account of the licensee. Operation 14008 may be performed by one or more hardware processors configured by machine-readable instructions including a module that is the same as or similar to fund management module 13112, in accordance with one or more implementations.

Figure 141:
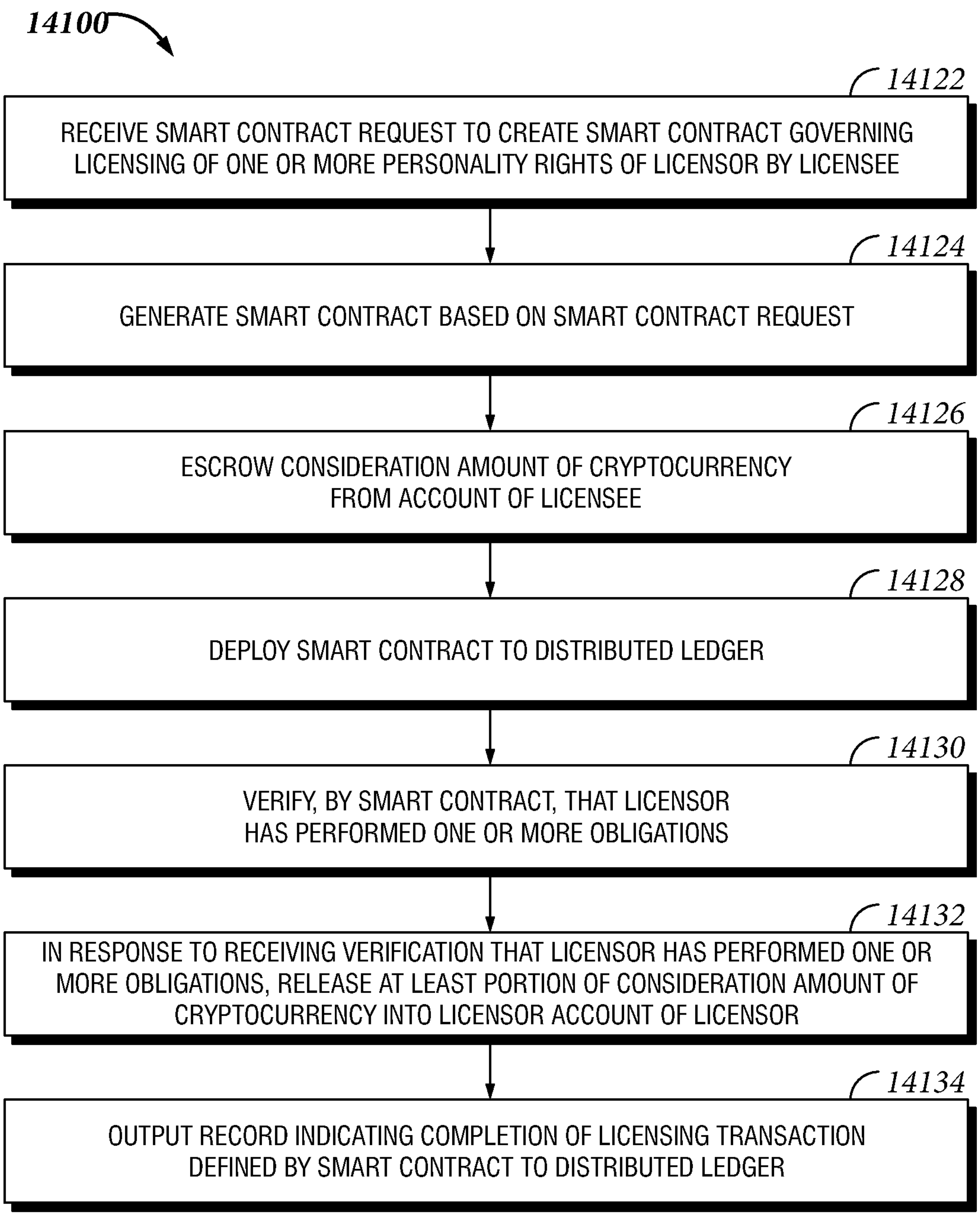
FIG. 141 depicts a set of operations of a method for facilitating the licensing of personality rights of a licensor by a licensee according to some embodiments of the present disclosure.

FIG. 141 illustrates method 14100, in accordance with one or more implementations of the present disclosure.

At 14122, the method includes receiving a smart contract request to create a smart contract governing the licensing of the one or more personality rights of the licensor by the licensee. The smart contract request may indicate one or more terms including a consideration amount of cryptocurrency to be paid to the licensor in exchange for one or more obligations on the licensor. Operation 14122 may be performed by one or more hardware processors configured by machine-readable instructions including a module that is the same as or similar to the ledger management module 13116, in accordance with one or more implementations.

At 14124, the method includes generating the smart contract based on the smart contract request. Operation 14124 may be performed by one or more hardware processors configured by machine-readable instructions including a module that is the same as or similar to ledger management module 13116, in accordance with one or more implementations.

At 14126, the method includes escrowing the consideration amount of cryptocurrency from the account of the licensee. Operation 14126 may be performed by one or more hardware processors configured by machine-readable instructions including a module that is the same as or similar to fund management module 13112, in accordance with one or more implementations.

At 14128, the method includes deploying the smart contract to a distributed ledger. Operation 14128 may be performed by one or more hardware processors configured by machine-readable instructions including a module that is the same as or similar to ledger management module 13116, in accordance with one or more implementations.

At 14130, the method includes verifying, by the smart contract, that the licensor has performed the one or more obligations. Operation 14130 may be performed by one or more hardware processors configured by machine-readable instructions including a module that is the same as or similar to verification module 13118, in accordance with one or more implementations.

At 14132, the method includes in response to receiving verification that the licensor has performed the one or more obligations, releasing at least a portion of the consideration amount of cryptocurrency into a licensor account of the licensor. Operation 14132 may be performed by one or more hardware processors configured by machine-readable instructions including a module that is the same as or similar to the verification module 13118, in accordance with one or more implementations.

At 14134, the method includes outputting a record indicating a completion of a licensing transaction defined by the smart contract to the distributed ledger. Operation 14134 may be performed by one or more hardware processors configured by machine-readable instructions including a module that is the same as or similar to the verification module 13118 and/or the ledger management module 13116, in accordance with one or more implementations.

Figure 142:
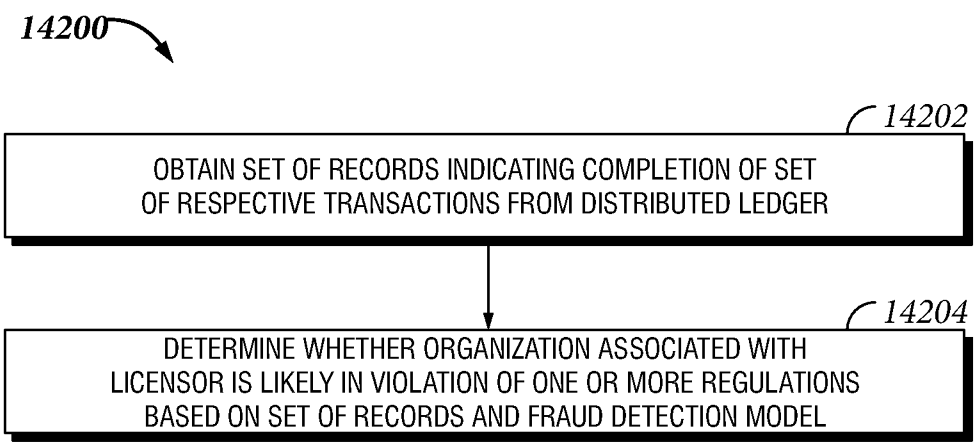
FIG. 142 depicts a set of operations of a method for detecting potential circumvention of rules or regulations by a licensor and/or licensee according to some embodiments of the present disclosure.

FIG. 142 illustrates method 14200, in accordance with one or more implementations.

At 14202, the method includes obtaining a set of records indicating completion of a set of respective transactions from the distributed ledger. The set of records may include the record indicating the completion of the transaction defined by the smart contract. Operation 14202 may be performed by one or more hardware processors configured by machine-readable instructions including a module that is the same as or similar to the analytics module 13120, in accordance with one or more implementations.

At 14204, the method includes determining whether an organization associated with the licensor is likely in violation of one or more regulations based on the set of records and a fraud detection model. Operation 14204 may be performed by one or more hardware processors configured by machine-readable instructions including a module that is the same as or similar to the analytics module 13120, in accordance with one or more implementations.

Figure 143:
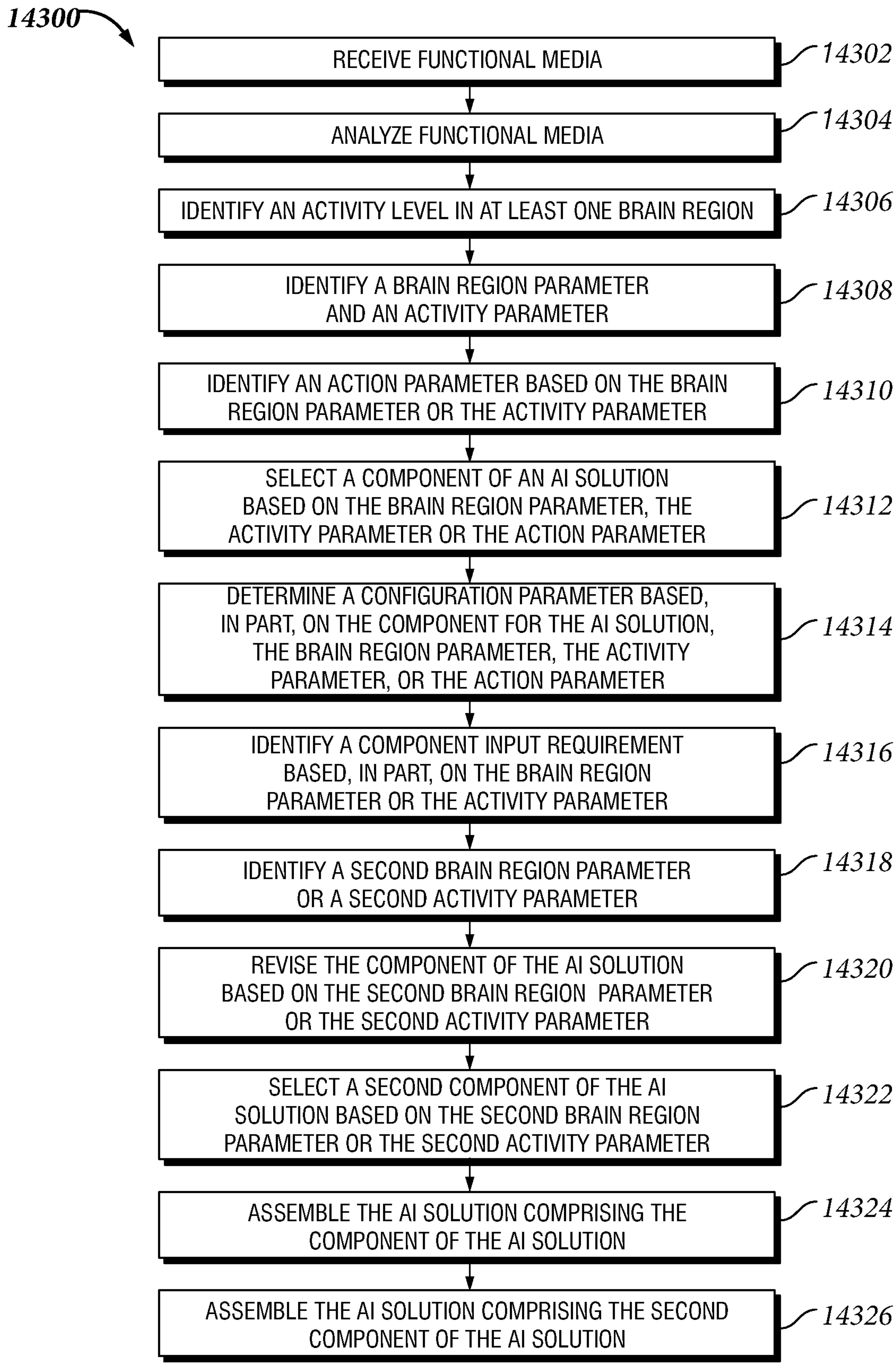
FIG. 143 depicts a method for selecting an AI solution.

Referring to FIG. 143, a computer-implemented method 14300 for selecting an AI solution for use in a robotic or automated process is depicted. The computer-implemented method may include receiving one or more functional media 14302. The functional media may include information indicative of brain activity of a worker engaged in a task to be automated. The functional media may be functional imaging, such an MRI, an FMRI, and the like from which an area of neocortex activity may be identified. The functional media may be an image, a video stream, an audio stream, and the like, from which a type of brain activity may be inferred. The functional media may be acquired while the worker is performing the work or while performing a simulation of the work, for example in an augmented reality, a virtual reality environment, or on a model of the equipment and/or environment. After being received, the functional media(s) are analyzed 14304 to identify an activity level in at least one brain region 14306. Based on the activity level, a brain region parameter and/or an activity parameter are identified 14308. The brain region parameter may represent a specific region of the neocortex such as frontal, parietal, occipital, and temporal lobes of the neocortex, including primary visual cortex and the primary auditory cortex, or subdivisions of the neocortex, including ventrolateral prefrontal cortex (Broca's area), and orbitofrontal cortex. The activity parameter may represent functional areas of the brain, such as visual processing, inductive reasoning, audio processing, olfactory processing, muscle control, and the like. An activity parameter may be representative of a type of activity in which the worker is engaged such as visual processing (looking) audio processing (listening), olfactory processing (smelling), motion activity, listening to the sound of the equipment, watching another negotiator, and the like. An activity level may be representative of a strength or level of activity, such as an extent of the brain region involved, a signal strength, whether a brain region is engaged or unengaged, and the like.

Based on one or more of the brain region parameter, the activity parameter, or the activity level, an action parameter may be identified 14310. An action parameter may provide additional information regarding the activity parameter. For example, activity parameter is indicative of motion, an action parameter may describe a range of motion, a speed of motion, a repetition of motion, a use of muscle memory, a smoothness of motion, a flow of motion, a timing of motion, and the like. Based on one or more of the brain region parameter, the activity parameter, or the activity level, a component to be incorporated in the final AI solution may be selected 14312. The component may include one or more of a model, an expert system, a neural network, and the like. After the component for the AI solution has been selected, configuration parameters may be determined 14314. The configuration parameters may be based, in part, on the type of component selected, the brain region parameter, the activity parameter, the activity level, or the action parameter. Configuring and configuration parameters may include selecting an input for a machine learning process, identifying an output to be provided by the machine learning process, identifying an input for an operational solution process 14316, identifying an output an operational solution process, tuning a learning parameter, identifying a change rates, identifying a weighting factor, identifying a parameter for inclusion, identifying a parameter for exclusion of a parameter, setting a threshold for input data, setting an output threshold for the operational robotic process, or setting a parameter threshold. Additionally, analysis of the functional media 14304 may include identifying a second brain region parameter or a second activity parameter 14318. The component of the AI solution may be revised 14320 based on the second brain region parameter or the second activity parameter. A second component of the AI solution may be selected 14322 based on the second brain region parameter or the second activity parameter. The final AI solution may be assembled from the component 14324 or the second component 14326. In embodiments, the final AI solution may be assembled from the component and the second components, optionally along with any standard or mandatory components that enable operation.

Figure 144:
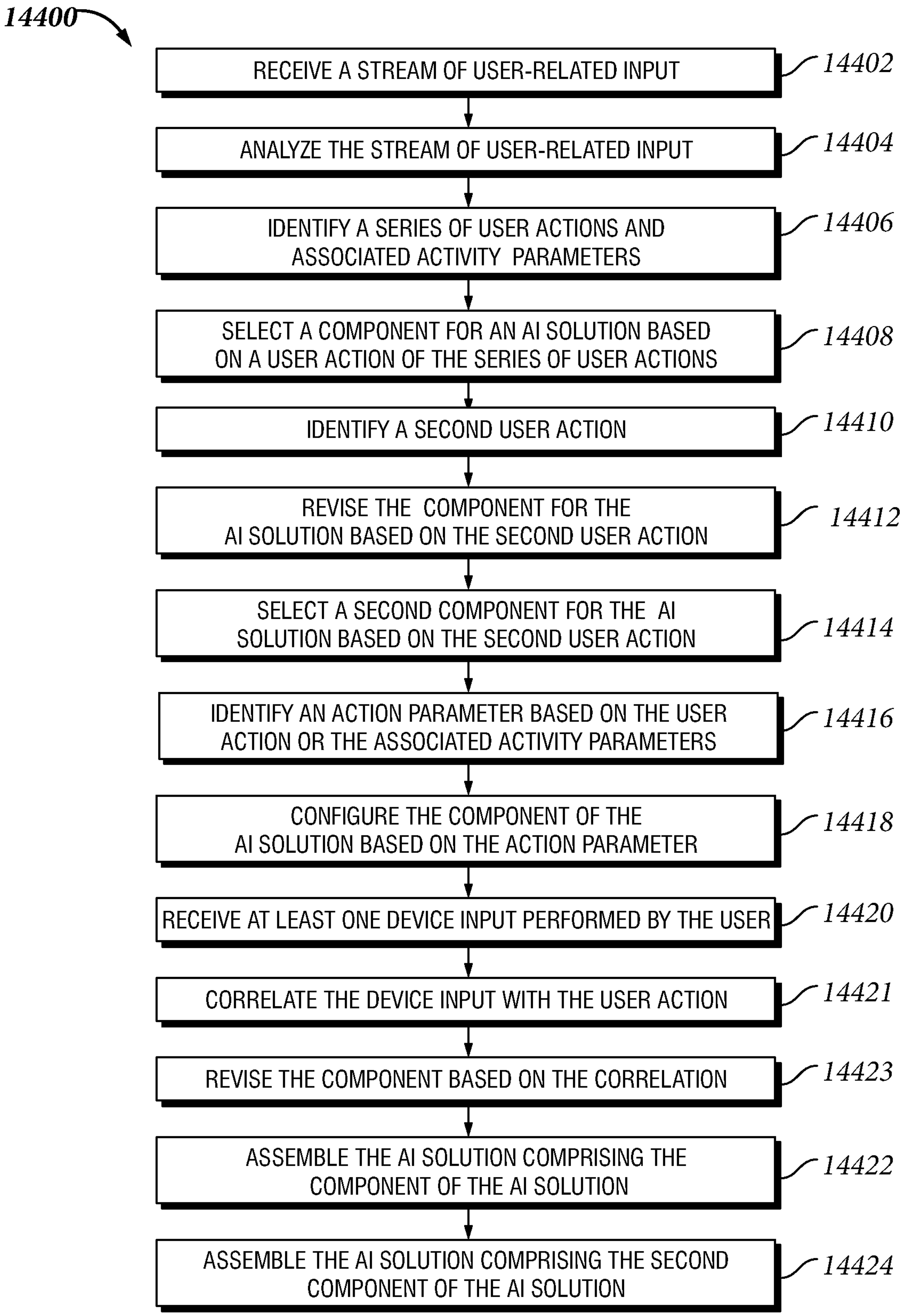
FIG. 144 depicts a method for selecting an AI solution.

Referring to FIG. 144, a computer-implemented method 14400 for selecting an AI solution for use in a robotic or automated process is depicted. The method may include receiving a user-related input 14402 comprising a timestamp and analyzing the user-related input 14404. The user-related input may include an audio feed, a motion sensor, a video feed, a heartbeat monitor, an eye tracker, a biosensor (e.g., galvanic skin response), and the like. The analysis may enable the identification of a series of user actions and associated activity parameters 14406. A component for an AI solution may be selected based on a user action of the series of user actions 14408. The analysis may enable the identification of a second user action of the series of user actions 14410. Based on the second user action, the selected component for the AI solution may be revised 14412. A second component for the AI solution may be selected 14414 based on the second user action. An action parameter may be identified 14416 based on the user action and/or the associated activity parameters. For example, if the user action is motion, an action parameter may include a range of motion, a speed of motion, a repetition of motion, a use of muscle memory, a smoothness of motion, a flow of motion, a timing of motion, and the like. The selected component of the AI solution may be configured 14418 based on the action parameter. In embodiments, at least one device input performed by the user may be received (14420). The device input may be synchronized with the user actions based on the timestamp and a correlation between the device input and the user action determined 14419. The component may be revised 14423 based on the correlation. The selection of the component of the AI solution may be partially based on the correlation between the device input and the user-related input 14421. The AI solution may be assembled 14422 from the component. The AI solution may be assembled from the second component 14424. In embodiments, the AI may be assembled from both the component and the second component, optionally along with any standard or mandatory components that enable operation.

Figure 145:
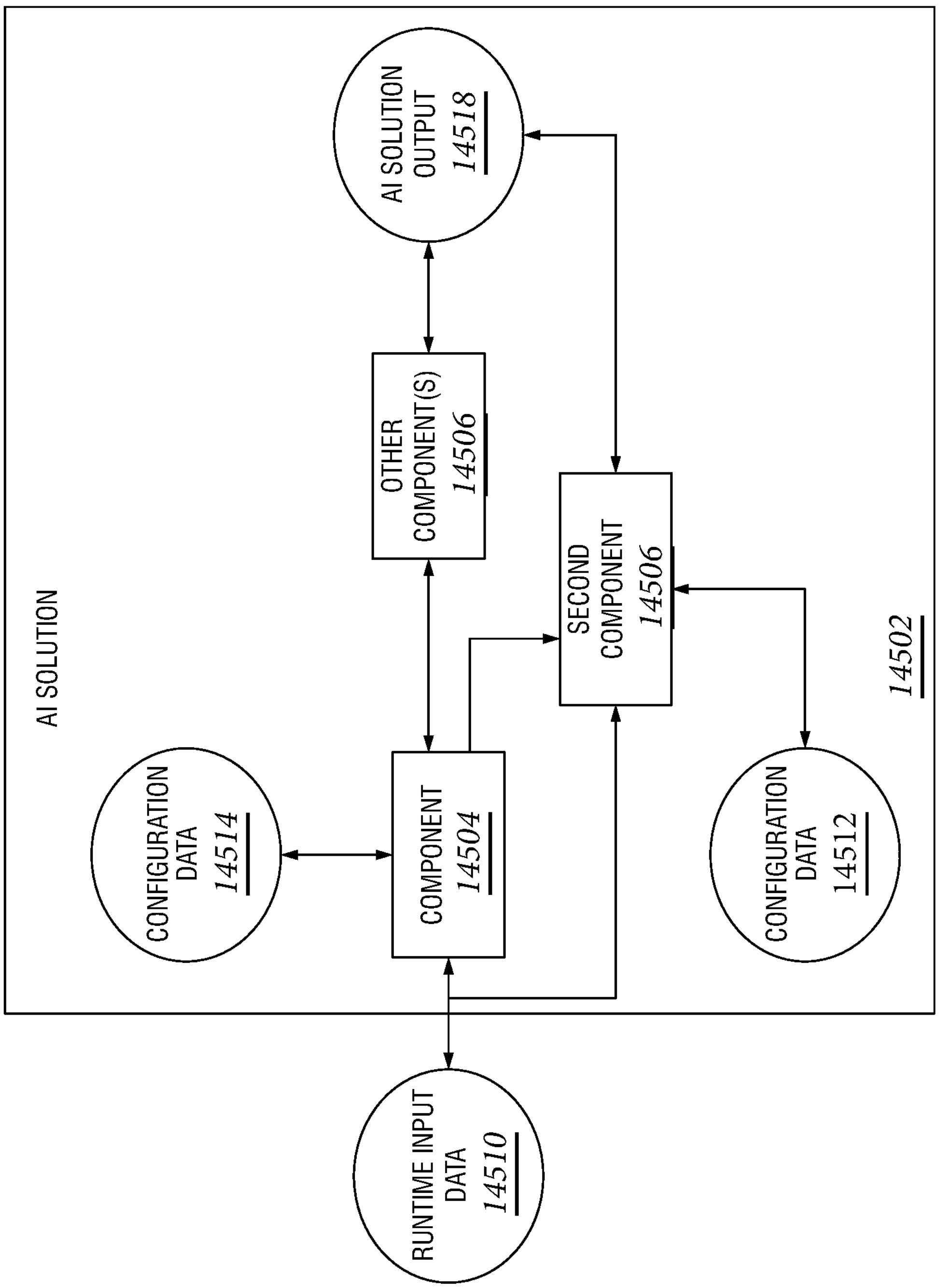
FIG. 145 depicts an example of an assembled AI solution.

Referring to FIG. 145, an illustrative and non-limiting example of an assembled AI solution 14502 is shown. The assembled AI solution 14502 may include the selected component 14504 and a second selected component 14506, as well as other components 14508. Configuration data 14514 for the first selected component and configuration data 14512 for the second selected component may be provided. Runtime input data 14510 may be specified as part of the component configuration process. Components may be structured to run serially (such as the selected component 14504 and the second selected component 14506 which received input from the selected component 14504) or in parallel (such as the second component 14506 and the other component(s) 14508). Some of the components may provide input for other components (such as the selected component 14504 providing input to the second selected component 14506). Multiple components may provide various portions of the overall AI solution output 14518 (such as the second selected component 14506 and the other components 14508). This depiction is not meant to be limiting and the final solution may include a varying number of components, configuration data and input, as well as other components (e.g., sensors, voice modulators, and the like) and may be interconnected in a variety of configurations.

Figure 146:
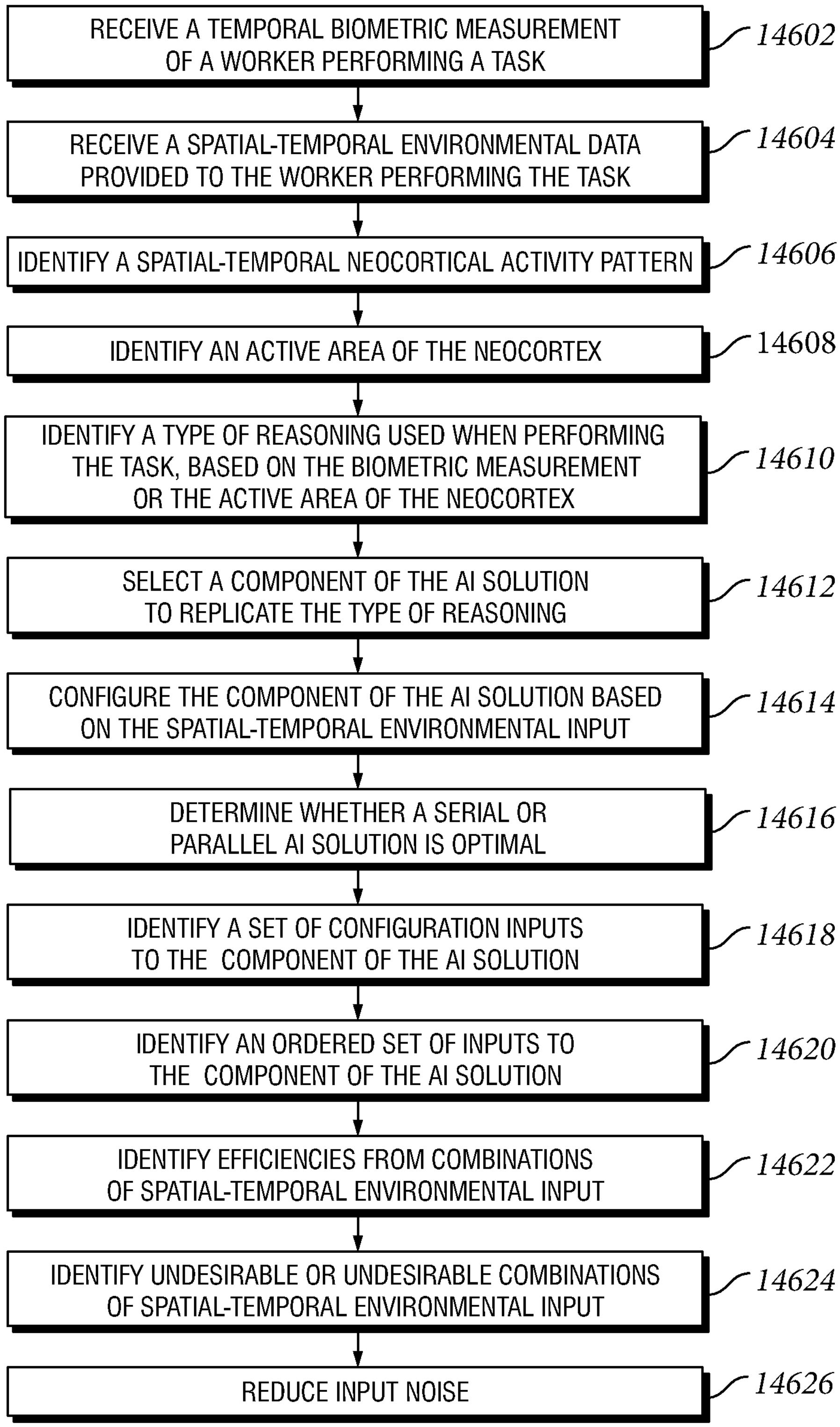
FIG. 146 depicts a method for selecting an AI solution.
Figure 147:
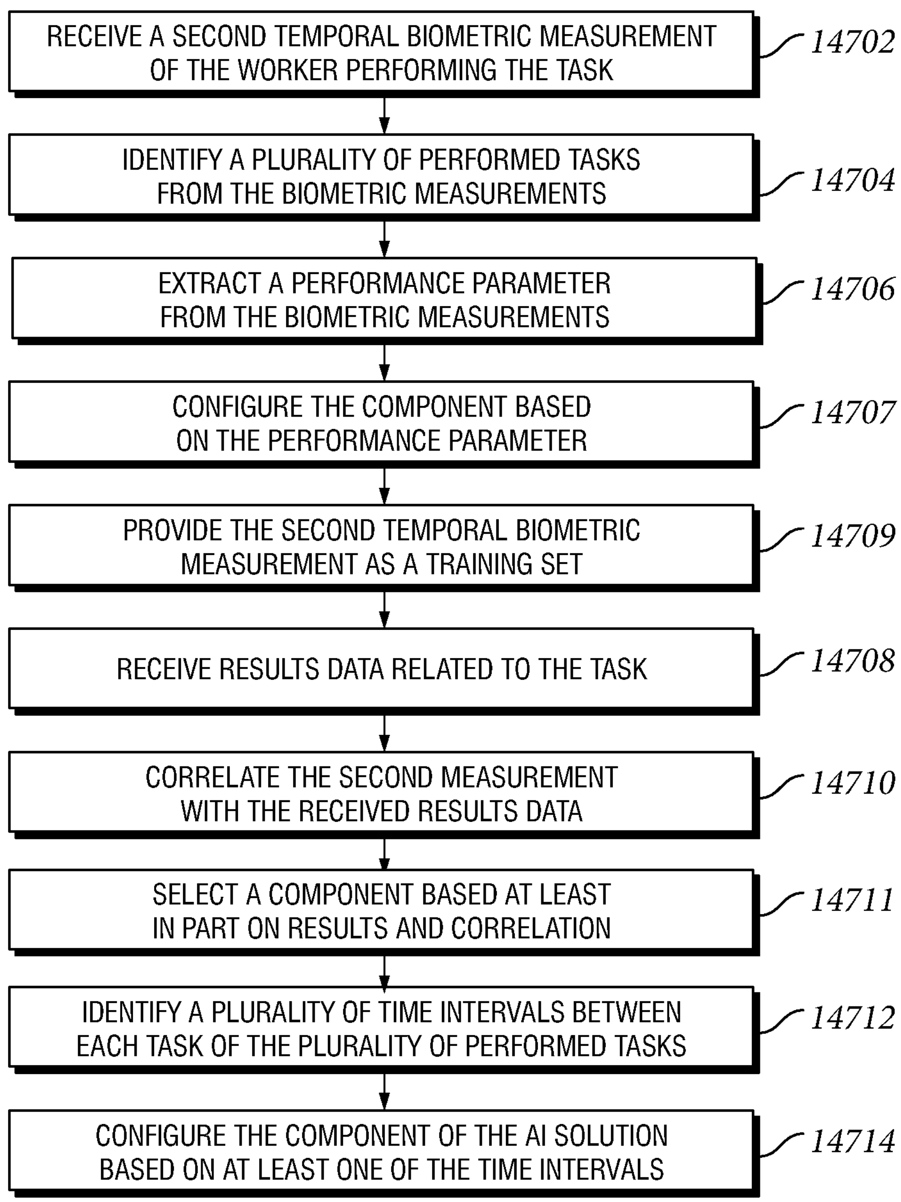

Referring to FIGS. 146-147, a computer-implemented method for selecting an AI solution for use in a robotic or automated process is depicted. The method may include receiving temporal biometric measurement data 14602 of a worker performing a task and receiving spatial-temporal environmental data 14604 experienced by the worker performing the task. Using the received data, a spatial-temporal activity pattern may be identified 14606. Based on the spatial-temporal activity pattern, an active area of the worker's neocortex may be identified 14608. A type of reasoning used when performing the task may be identified 14610 based on the active area of the neocortex and/or the biometric measurement data, or the spatial-temporal environmental data. A component may be selected 14612 for use in the AI solution to replicate the type of reasoning. The component of the AI solution may be configured 14614 based on the spatial-temporal environmental input. A determination may be made as to whether a serial or parallel AI solution is optimal 14616. A set of configuration inputs to the component may be identified 14618 and an ordered set of inputs to the component of the AI solution may be identified 14620. Training the machine may include providing various subsets of the spatial-temporal environmental input to determine appropriate input weightings and identify efficiencies from combinations of spatial-temporal environmental input 14622. Desirable or undesirable combinations of the spatial-temporal environmental data may also be identified 14624. Based on the identified required input, input environmental data may be processed to reduce input noise 14626 (e.g. improve signal to noise for a signal of interest), filtered to provide the appropriate input signals to the component, and the like.

Continuing with reference to FIG. 147, a second temporal biometric measurement data of the same worker performing the task may be received 14702 and a plurality of performed tasks identified from the biometric measurements 14704. A performance parameter may be extracted from the biometric measurements 14706 (e.g. worker heartrate, galvanic skin response, and the like). In some embodiments, the component may be configured based on the performance parameter 14707. In some embodiments, the second temporal biometric measurements may be provided to the configuration module as a training set 14709. Results data related to the task may be received 14708 and the second temporal biometric measurement data may be correlated with the received results data 14710. In some embodiments, the component may be selected based, at least in part, on the correlation 14711. A series of time intervals between each of the plurality of performed tasks may be identified 14712 and the component of the AI solution configured based on at least one of the time intervals 14714. For example, if the worker inspects an object for a long period of time before moving on to the next action, this may indicate complex visual processing as well as mental processing and may indicate that the corresponding component for the task be configured for in-depth, fine detail processing and the like.

Figure 148:
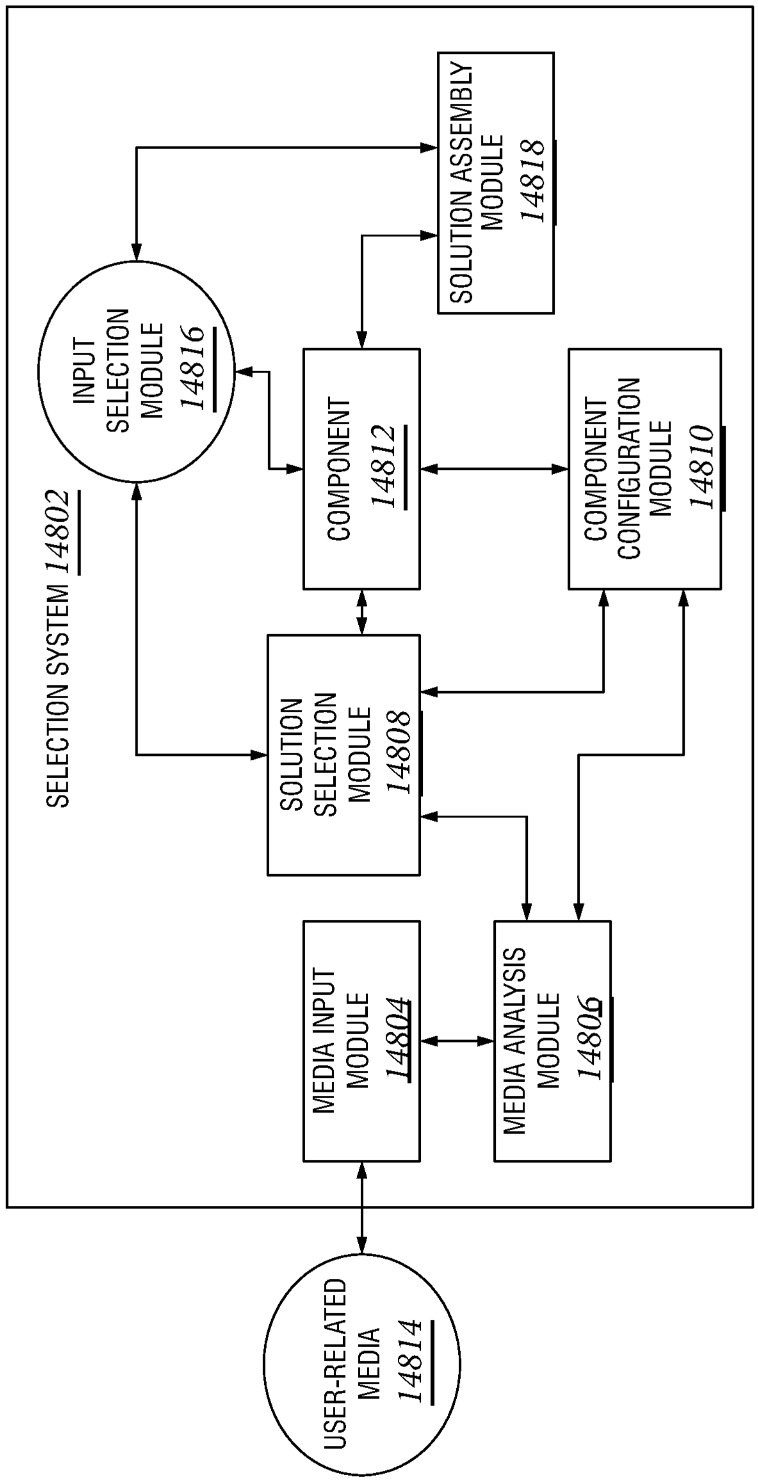

Referring to FIG. 148, an AI solution selection and configuration system 14802 is depicted. An example selection and configuration system 14802 may include a media input module 14804 structured to receive user-related functional media 14814. The user-related functional media 14814 may include images of a person engaged in a task to be automated, audio recordings, video feeds, biometric data (e.g., heartbeat data, galvanic skin response data, and the like), motion data, and the like. A media analysis module 14806 may analyze the received media and identify an action parameter. The action parameter may be representative of a type of activity in which the person appears to be engaged such as watching, listening, moving, thinking, and the like. In some embodiments, the functional media is indicative of a type of brain activity of a human engaged in the task to be automated and the media analysis module 148206 identifies an activity level in at least one brain region and provide a brain region parameter corresponding with the activity level in the identified brain region. The media analysis module may also identify an activity parameter indicative of a level of engagement such as engaged, unengaged, level of activity, type of activity, and the like. A solution selection module 14808 may be structured to select at least one component of the AI solution for use in the automated process based, at least in part, on the action parameter, the brain region parameter, or the activity parameter. The brain region parameter or the action parameter may suggest a type of component to select and the activity parameter may suggest a level of processing required for that component. For example, an action parameter of watching would suggest selecting a component suited to visual processing. If the activity parameter was representative of olfactory procession, the input specification module may identify at least one chemical sensor as an input. If the activity parameter is representative of visual processing the input specification module 13116 may identify at least one visual sensor as a robotic input. In some embodiments, the visual sensor may be selected to be sensitive to a portion of the visible spectrum with wavelengths between about 380 to 700 nanometers. If the activity parameter is representative of auditory processing, the input specification module 13116 may identify at least one microphone as a robotic input. If the activity parameter was representative of a very high level of concentration, the solution selection module 14808 may suggest a level of processing that will be required, where the processing might occur, and the like. A component configuration module 14810 may configure the component 14812. Configuring the component may include: selecting an input for a machine learning process for the selected component, identifying an output to be provided by the machine learning process, identifying an input for an operational solution process, identifying an output an operational solution process, tuning a learning parameter, identifying a change rates, identifying a weighting factor, identifying a parameter for inclusion, identifying a parameter for exclusion of a parameter, setting a threshold for input data, setting an output threshold for the operational robotic process, setting a parameter threshold, and the like. A solution assembly module 14818 may assemble the final AI solution based on one or more selected components, configuration components, and required runtime. An input specification module 14816 may suggest input sources based on the selected component, the action parameter, brain region parameter, activity parameter, or the like.

Figure 149:
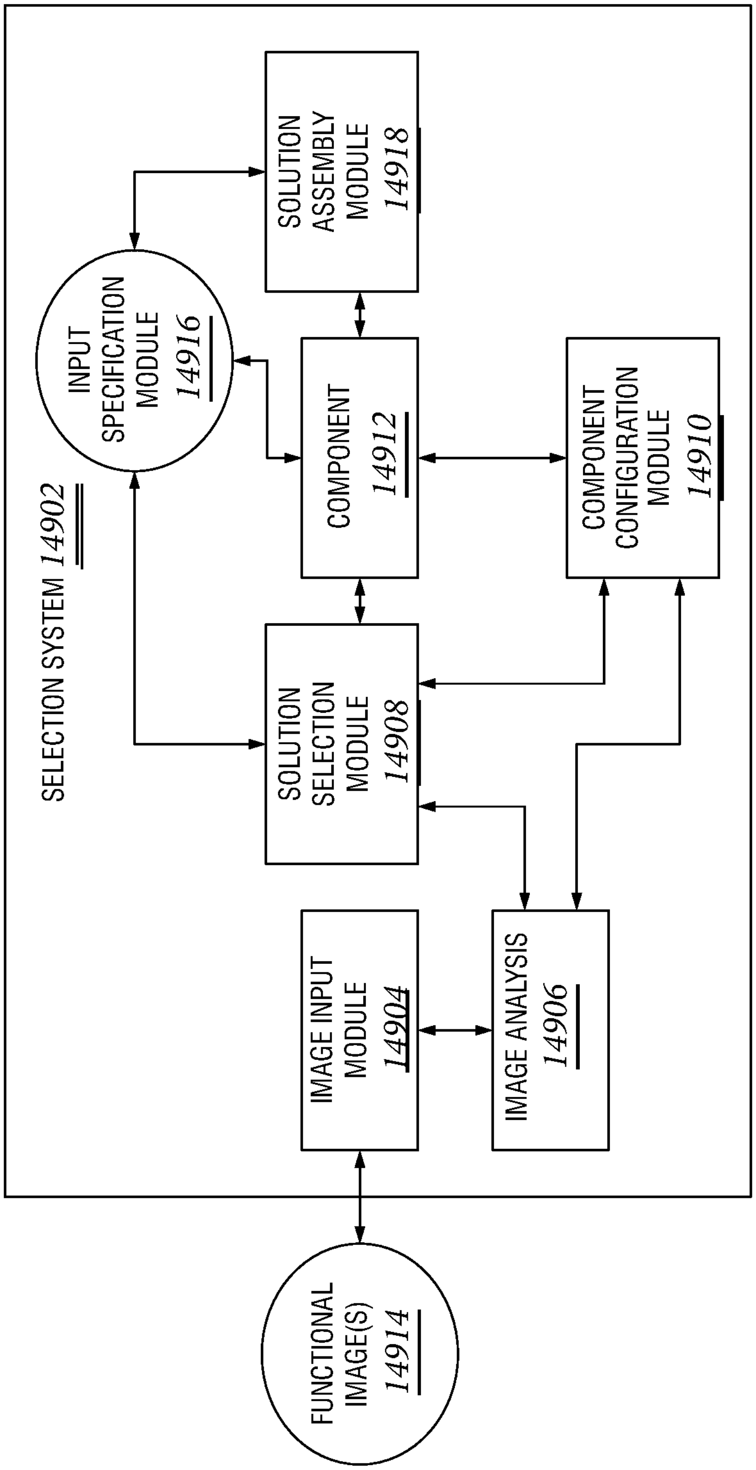
Figure 150:
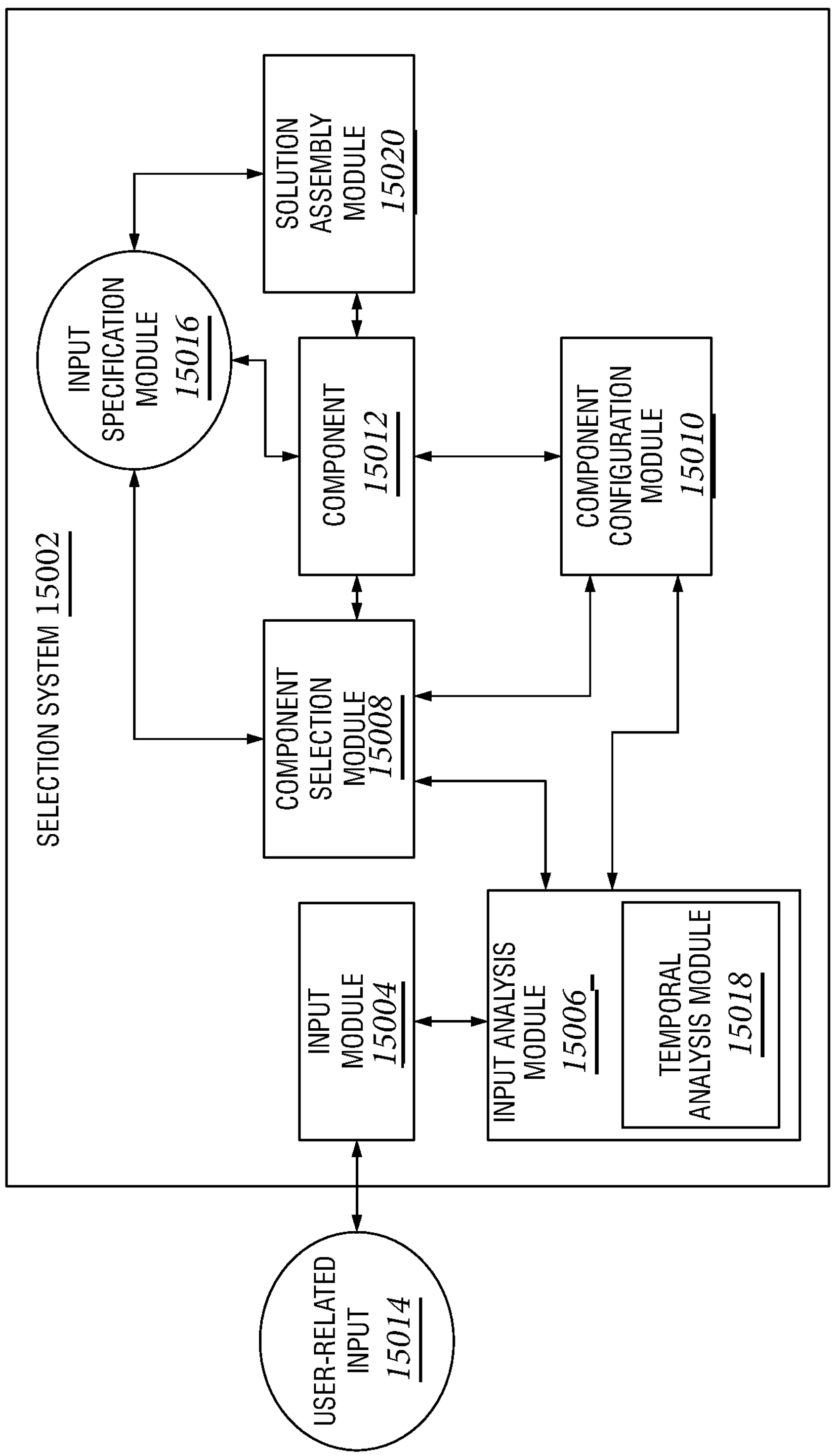

Referring to FIG. 149, an AI solution selection and configuration system 14902 is depicted. An example selection system 14902 may include an image input module 14904 structured to receive functional images 14914 of the brain such as, such as functional MRI or other magnetic imaging, electroencephalogram (EEG), or other imaging, such as by identifying broad brain activity (e.g., wave bands of activity, such as delta, theta, alpha and gamma waves), by identifying a set of brain regions that are activated and/or inactive while the worker is performing one of the tasks to be automated. The image input module 14904 may provide a subset of the functional images 14914 to the image analysis module 14906. In some embodiments, the image input module 14904 may perform some preprocessing for the subset of functional images 14914, such as noise reduction, histogram adjustment, filtering, and the like, prior to providing the subset of functional images 14914 to the image analysis module 14906. The image analysis module 14906, may identify an activity level in at least one brain region and provide a brain region parameter based on the subset of functional images. The brain region parameter may represent a specific region of the neocortex such as frontal, parietal, occipital, and temporal lobes of the neocortex, including primary visual cortex and the primary auditory cortex, or subdivisions of the neocortex, including ventrolateral prefrontal cortex (Broca's area), and orbitofrontal cortex. The brain region parameter may represent functional areas of the brain, such as visual processing, inductive reasoning, audio processing, olfactory processing, muscle control, and the like. A solution selection module 14908 may select a component for use in an AI solution based on the brain region parameter, and provide input into a component configuration module (such as selecting an input for a machine learning process, identifying an output to be provided by the machine learning process, identifying an input for an operational solution process, identifying an output an operational solution process, tuning a learning parameter, identifying a change rates, identifying a weighting factor, identifying a parameter for inclusion, identifying a parameter for exclusion of a parameter, setting a threshold for input data, setting an output threshold for the operational robotic process, and setting a parameter threshold, and the like. The component configuration module 14910, may use the input to configure the component 14912. The solution selection module 14908 may also supply data to the input specification module 14916. A solution assembly module 14918 may combine the component, and other components, to create the AI solution. The AI solution may be set up to receive inputs as specified by the input specification module 14916. Although one iteration of selecting a component is shown in this figure, it is envisioned, that multiple components may be selected, configured, and assembled as part of the AI solution Referring to FIGS. 150-151, an AI solution selection and configuration system 15002 is depicted. An example AI solution selection and configuration system 15002 may include an input module 15004 structured to receive a variety of user-related input such as videos, audio recording, heartbeat monitors, galvanic skin response data, motion data, and the like. There may be temporal data associated with the user-related input. The input module 15004 may provide a subset of the user-related input data 15014 to the input analysis module 15006. The analysis module 15006 may include a temporal analysis module 15018 to identify timing of user-related actions. The temporal analysis module 15018 may enable identification of timing of user actions. In some embodiments the input module 15004 may perform some preprocessing for the subset of the user-related input data 15014, such as noise reduction, correlation between types of input data, and the like, prior to providing the subset of user-related input data 15014 to the input analysis module 15006. The input analysis module 15006, may identify a type of brain activity being engaged in (e.g. visual processing, auditory processing, olfactory processing, motion control, and the like) and a level of intensity of activity based on data such as heartbeat data, galvanic skin response data and the like. A component selection module 15008 may select a component for use in an AI solution based on the type of brain activity and provide input into a component configuration module 15010 which may include an ML input selection module 15102 for selecting an input for a machine learning process, an MP output identification module 15104 for identifying an output to be provided by the machine learning process, a runtime input selection module 15106 for identifying an input for an operational solution process, a runtime output identification module 15108 for identifying an output of the component, a settings module 15110 for identifying a change rate, identifying a weighting factor, setting a threshold for input data, setting an output threshold for the operational robotic process, and the like, a parameter settings module 15112 for tuning a learning parameter, identifying a parameter for inclusion, identifying a parameter for exclusion, setting a parameter threshold, and the like. The component configuration module 15010 may configure the selected component 15012. The component selection module 15008 may also supply data to the input specification module 15016. An AI solution assembly module 15020 may combine the configured component with other components, along with any standard or mandatory components, as necessary, to create the AI solution. The AI solution may be set up to receive inputs as specified by the input specification module 15016. Although one iteration of selecting a component is shown in this figure, it is envisioned, that multiple components may be selected, configured, and assembled as part of the AI solution.

Figure 152:
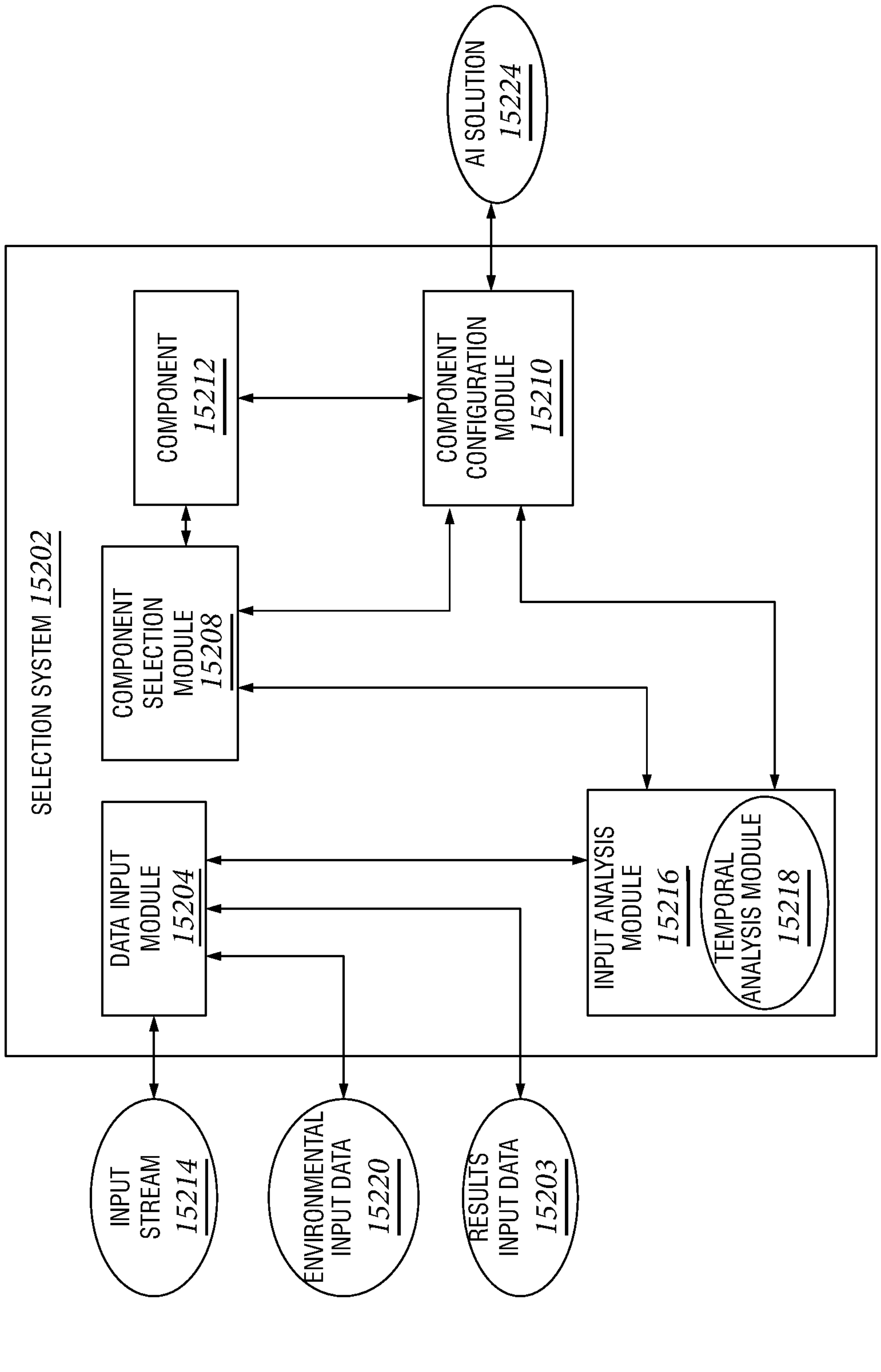

In embodiments, referring to FIG. 152, an AI solution selection and configuration system 15202 is depicted. An example AI solution selection and configuration system 15202 may include a data input module 15204 to receive an input stream including temporal user-related data 15214 which may include video streams, audio streams, equipment interactions (e.g. mouse clicks, mouse motion, physical input to a machine) user biometrics such as heartbeat, galvanic skin response, eye tracking, and the like. The data input module 15204 may also receive temporal environmental input data 15220 representative of environmental input the user is receiving such as a visual environment, an auditory environment, olfactory environment, equipment displays, a device user interface, and the like. The data input module 15204 may also receive temporal results input data 15203. The data input module 15204 may provide a subset of the received data 15214, 15220, 15203 to an input analysis module 15216. The data input module 15204 may process the received data 15214, 15220 15203 to reduce noise, compress the data, correlate some of the data, and the like. The analysis module 15216 may identify a plurality of user actions to provide to the component selection module 15208. The image analysis module 15216 may include a temporal analysis module 15218 to identify timing of user actions. The temporal analysis module 15218 may allow for the correlation between temporal user-related data 15214, environmental data 15220, and results data 15203. Based on the user actions, the component selection module 15208 may select a component that would simulate one or more mental processes of the user needed to perform at least one of the plurality of user actions. Factors in identifying the selected component may include the level of computational intensity needed, time sensitivity, and the like. This may dictate a type of component, a location of component (on-board, in the cloud, edge-computing, and the like. The input analysis module 15216 may also provide information regarding the user's actions and environmental data to the component configuration module 15210. This data may be used by the component configuration module as input to a machine learning algorithm, in conjunction with the results data to identify which inputs are beneficial and which are detrimental to enabling the component to reach desired results, and identify appropriate weighting of inputs, parameter settings, and the like. The component configuration module 15210 configures the component 15212 which is provided to the overall AI solution 15224 together with configuration information.

As described elsewhere herein, this disclosure concerns systems and methods for the discovery of opportunities for increased automation and intelligence, including solutions to domain-specific problems. Further, this disclosure also concerns selection and configuration of an artificial intelligence solution (e.g. neural networks, machine learning systems, expert systems, etc.) once opportunities are discovered.

Figure 153:
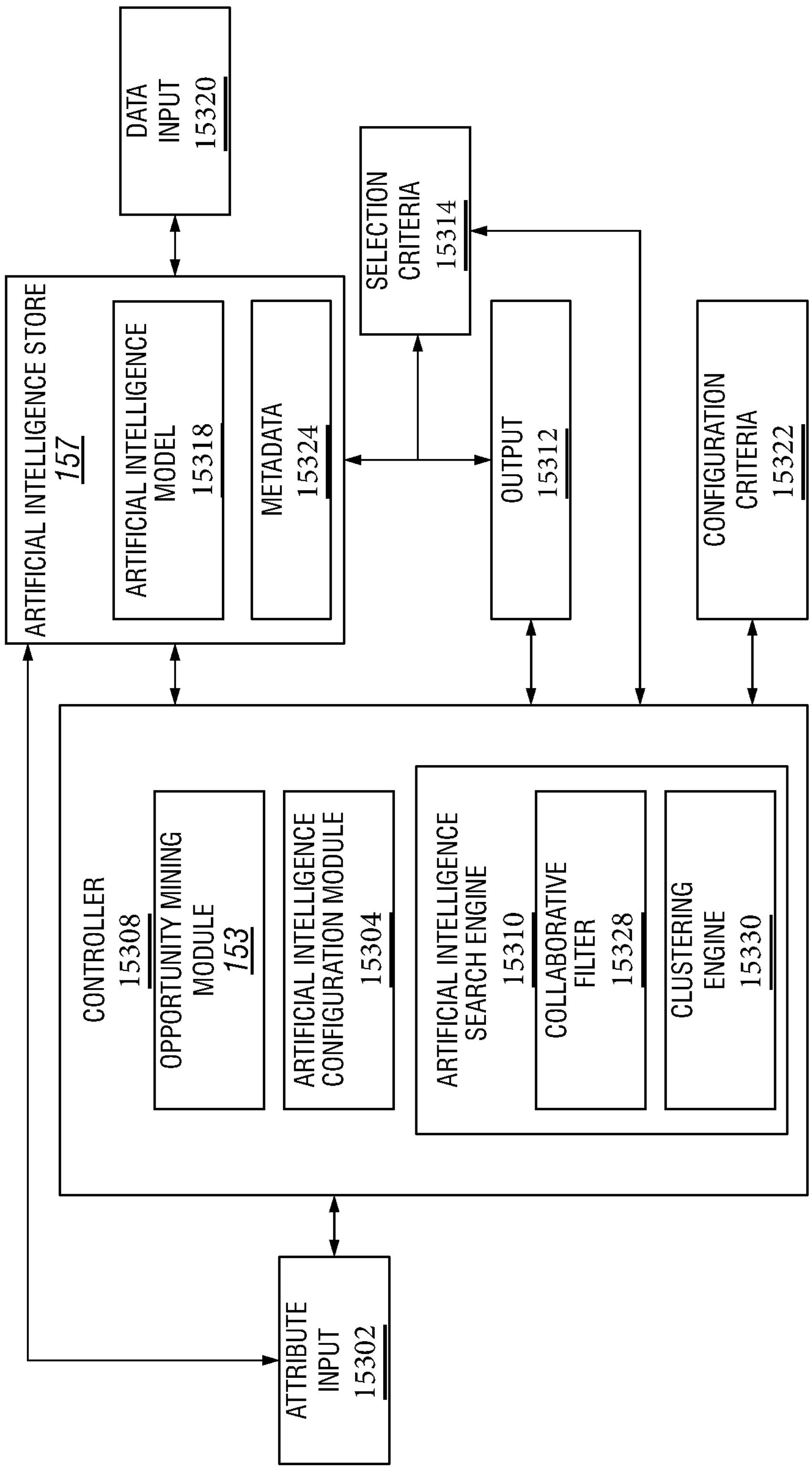

Referring now to FIG. 153, a controller 15308 includes an opportunity mining module 153, an artificial intelligence configuration module 15304, and an artificial intelligence search engine 15310, optionally having a collaborative filter 15328 and a clustering engine 15330. The opportunity mining module 153 receives input 15302, such as attribute input regarding an attribute of a task, a domain, or a domain-related problem.

The input 15302 may be processed by the opportunity mining module 153 to determine whether an artificial intelligence system can be applied to the task or the domain. For example, the attribute input 15302 may include an attribute of a task, domain, or problem, such as a negotiating task, a drafting task, a data entry task, an email response task, a data analysis task, a document review task, an equipment operation task, a forecasting task, an NLP task, an image recognition task, a pattern recognition task, a motion detection task, a route optimization task, and the like. The opportunity mining module 153 may determine if one or more attributes of the task are similar to other tasks that have been automated or to which an intelligence has been applied, or based on the attribute of the task, if the task is potentially automatable or suitable to have an intelligence applied to it regardless of whether it has been done previously. For example, attributes of a drafting task may include articulating a first idea, articulating a second idea, articulating a plurality of ideas, combining the plurality of ideas in a pairwise fashion, and combining the ideas in a triplicate fashion. Articulating ideas may not be suitable for automation, but the task of combining ideas pairwise or in triplicate form may be suitable for automation or to have an intelligence applied to the task.

If a determination is made that an artificial intelligence system can be applied to the task or the domain, the output 15312 regarding that determination may be used to trigger an artificial intelligence search engine 15310 to perform a search of an artificial intelligence store 157. The artificial intelligence store 157 may include a plurality of domain-specific and general artificial intelligence models 15318, and components of domain-specific and general artificial intelligence models 15318. The artificial intelligence store 157 may be organized by a category. The category may be at least one of an artificial intelligence model component type, a domain, an input type, a processing type, an output type, a computational requirement, a computational capability, a cost, a training status, or an energy usage. The artificial intelligence store may include at least one e-commerce feature. The at least one e-commerce feature may include at least one of a rating, a review, a link to relevant content, a mechanism for provisioning, a mechanism for licensing, a mechanism for delivery, or a mechanism for payment. Models 15318 may be pre-trained, or may be available for training. Components of domain-specific and general artificial intelligence models 15318 may include artificial intelligence building blocks, such as a component that detects and translates between languages, or a component that delivers highly personalized customer recommendations. One or more models 15318 and/or components of a model 15318 may be identified in a search of the artificial intelligence store 157. Components of a model 15318 may be identified either as a stand-alone element to be used in the assembly of a custom AI model 15318 or as a component of a complete, optionally pre-trained, model 15318.

The artificial intelligence store 157 may include metadata 15324 or other descriptive material indicating a suitability of an artificial intelligence system for at least one of solving a particular type of problem or operating on domain-specific inputs, data, or other entities. The metadata 15324, or other descriptive material, category, or e-commerce feature may be searched using the attribute input 15302 and/or other selection criteria 15314. For example, attributes of a task involving 2D object classification may be searched in the artificial intelligence store 157 and its metadata 15324 to reveal that an artificial intelligence model 15318 suitable for a task involving 2D object classification may be a convolutional neural network. Continuing with the example, there may be model diversity even within the class of convolutional neural networks (CNN) in the artificial intelligence store 157, such as a CNN calibrated to a certain type of 2D object recognition (e.g., straight edges) and another CNN calibrated to another kind of 2D object recognition (e.g., combo of curved and straight edges). In this example, if the further edge vs. curved attribute of the type of 2D object is searched, the artificial intelligence store 157 would present the CNN best suited to the 2D object to be classified.

In embodiments, in addition to the input 15302, at least one selection criteria 15314 may be used by the artificial intelligence search engine 15310 to search the artificial intelligence store 157 for artificial intelligence models 15318 and/or components thereof. Selection criteria used in the recommendation of an artificial intelligence model 15318 or model component may include at least one of if the model is pre-trained or not, an availability of the at least one artificial intelligence model 15318 or component thereof to execute in a user environment, an availability of the at least one artificial intelligence model 15318 or component thereof to a user, a governance principle, a governance policy, a computational factor, a network factor, a data availability, a task-specific factor, a performance factor, a quality of service factor, a model deployment consideration, a security consideration, or a human interface, which may be elsewhere described herein. For example, a governance principle, such as a requirement for an anti-bias review of pedestrian accident-avoidance systems, may be used to search an artificial intelligence store 157 for artificial intelligence models to apply to an autonomous driving task. In another example, a selection criteria for an artificial intelligence solution to be used with air traffic control system may be a requirement for having been trained on adversarial attacks and deceptive input. In yet another example, a selection criteria for an artificial intelligence solution to be used with an equities trading task may be the requirement for human oversight, and particularly, human-based final decisions.

The artificial intelligence search engine 15310 may rank one or more results of the search according to a strength or a weakness of the at least one artificial intelligence model 15318 or model component relative to the at least one selection criteria 15314. The ranked search results may be presented to a user for evaluation and consideration, and ultimately, selection. In embodiments, the artificial intelligence search engine 15310 may further include a collaborative filter 15328 that receives an indication of an element of the at least one artificial intelligence model 15318 or model component from a user that is used to filter the search results. In embodiments, the artificial intelligence search engine 15310 may further include a clustering engine 15330 structured to cluster search results comprising the at least one artificial intelligence model 15318 or model component. The clustering engine 15330 may be at least one of a similarity matrix or a k-means clustering. The clustering engine 15330 may associate at least one of similar developers, similar domain-specific problems, or similar artificial intelligence solutions in the search results.

Once an artificial intelligence model 15318 or components thereof are identified by the artificial intelligence search engine 15310, either by searching with the input 15302 alone or with both the input 15302 and a selection criteria 15314, an artificial intelligence configuration module 15304 may configure one or more data inputs 15320 to use with the at least one artificial intelligence model 15318 or model component. The artificial intelligence configuration module 15304 may, in certain embodiments, be operative in discovering and selecting what inputs 15320 may enable effective and efficient use of artificial intelligence for a given problem. In embodiments, the artificial intelligence configuration module 15304 may further configure the at least one artificial intelligence model 15318 or model component(s) in accordance with at least one configuration criteria 15322. In embodiments, individual data inputs and model components may be configured via one or more configuration criteria, while in other embodiments, a single configuration criteria governs configuration of data input, AI component assembly, and the like.

In embodiments, the at least one configuration criteria 15322 may include at least one of an availability of the at least one artificial intelligence model 15318 or model component to execute in a user environment, an availability of the at least one artificial intelligence model 15318 or model component to a user, a governance principle, a governance policy, a computational factor, a network factor, a data availability, a task-specific factor, a performance factor, a quality of service factor, a model deployment consideration, a security consideration, or a human interface. In embodiments, the at least one configuration criteria may include at least one of identifying a desired output, identifying training data, identifying parameters for exclusion or inclusion in training or operation of the model, an input data threshold, an output data threshold, a selection of a neural network type, a selection of an input model type, a setting of initial model weights, a setting of model size, a selection of computational deployment environment, a selection of input data sources for training, a selection of input data sources for operation, a selection of feedback function/outcome measures, a selection of data integration language(s) for inputs and outputs, a configuration of APIs for model training, a configuration of APIs 13114 for model inputs, a configuration of APIs 13114 for outputs, a configuration of access controls, a configuration of security parameters, a configuration of network protocols, a configuration of storage parameters, a configuration of economic factors, a configuration of data flows, a configuration of high availability, one or more fault tolerance environments, a price-based data acquisition strategy, a heuristic method, a decision to make a decision model, or a coordination of massively parallel decision making environments. In embodiments, the at least one configuration criteria may include parameters for assembly of an AI solution from a plurality of identified model components, optionally along with other standard or mandatory model components. For example, the model components may be configured to run in parallel, to run serially, or in a combination of serial and parallel.

For example, the artificial intelligence configuration module 15304 may configure an artificial intelligence model 15318 to weight one data input 15320 more heavily than another. For example, in the rain, an autonomous driving solution may weight input from a traction control system and a forward radar system more heavily than sensors targeted to increasing fuel efficiency, such as sensors measuring road slope and vehicle speed. After the rain, the weighting may be reversed.

In another example, the artificial intelligence configuration module 15304 may configure an artificial intelligence model 15318 to operate within certain thresholds of data input 15320. For example, an artificial intelligence model 15318 may be used in a combinatorial drafting task. When only two articulated ideas are provided to the model 15318, the model 15318 may not be triggered to operate. However, once the model 15318 receives a third articulated idea, its combinatorial processing of articulated ideas may commence.

The artificial intelligence configuration module 15304 may configure which sensors to use as data input 15320, how frequently to sample data, how frequently to transmit output, the weighting of various data inputs 15320, thresholds to apply to data from data inputs 15320, whether an output of one component of the model 15318 is used as input to another component of the model 15318, an order of operation of the components of the model 15318, a positioning of a model component within a workflow of a model, and the like.

The artificial intelligence configuration module 15304 may configure an artificial intelligence model 15318 from one or more model components identified by the artificial intelligence search engine 15310. For example, if the search result consisted solely of model components, the AI configuration module 15304 may configure where to place the identified 127 components in relation to one another, such as in a workflow or data flow, as well as in relation to other components that may be required for the model 15318 to function.

In embodiments, an artificial intelligence store 157 may include a set of interfaces to artificial intelligence systems, such as enabling the download of relevant artificial intelligence applications, establishment of links or other connections to artificial intelligence systems (such as links to cloud-deployed artificial intelligence systems via APIs, ports, connectors, or other interfaces) and the like.

Figure 154:
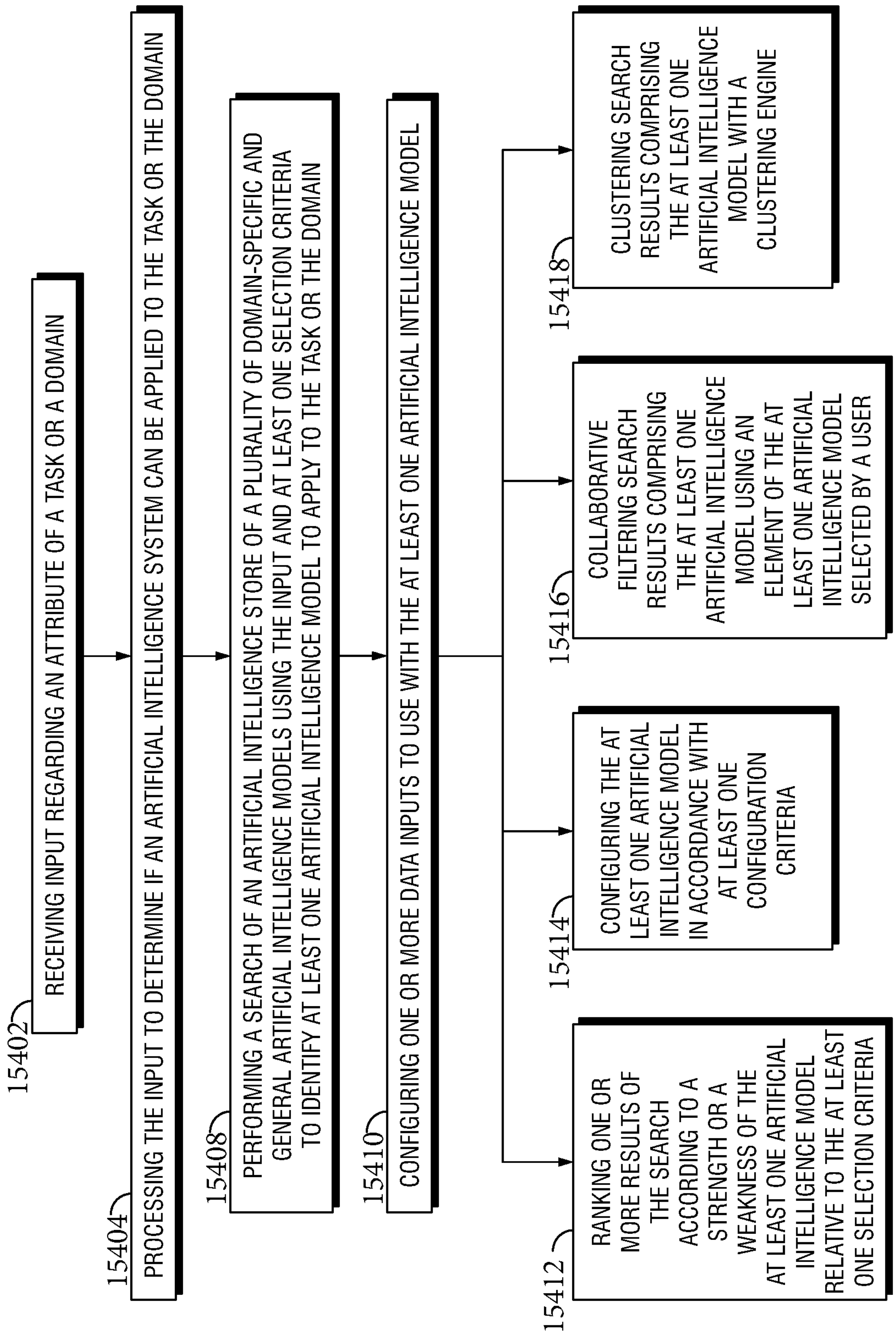

Referring now to FIG. 154, a method of artificial intelligence model identification and selection may include receiving input regarding an attribute of a task or a domain 15402, and processing the input to determine whether an artificial intelligence system can be applied to the task or the domain 15404, performing a search of an artificial intelligence store of a plurality of domain-specific and general artificial intelligence models and model components using the input and/or at least one selection criteria to identify at least one artificial intelligence model or model component to apply to the task or the domain 15408, and configuring one or more data inputs to use with the at least one artificial intelligence model 15410 or model component. The artificial intelligence store may include metadata or other descriptive material indicating a suitability of an artificial intelligence system for at least one of solving a particular type of problem or operating on domain-specific inputs, data, or other entities.

The method may further include ranking one or more results of the search according to a strength or a weakness of the at least one artificial intelligence model relative to the at least one selection criteria 15412. The method may further include configuring the at least one artificial intelligence model or model component in accordance with at least one configuration criteria 15414. The method may further include collaborative filtering search results comprising the at least one artificial intelligence model using an element of the at least one artificial intelligence model selected or model component by a user 15416. The method may further include clustering search results comprising the at least one artificial intelligence model or model component with a clustering engine 15418.

Figure 155:
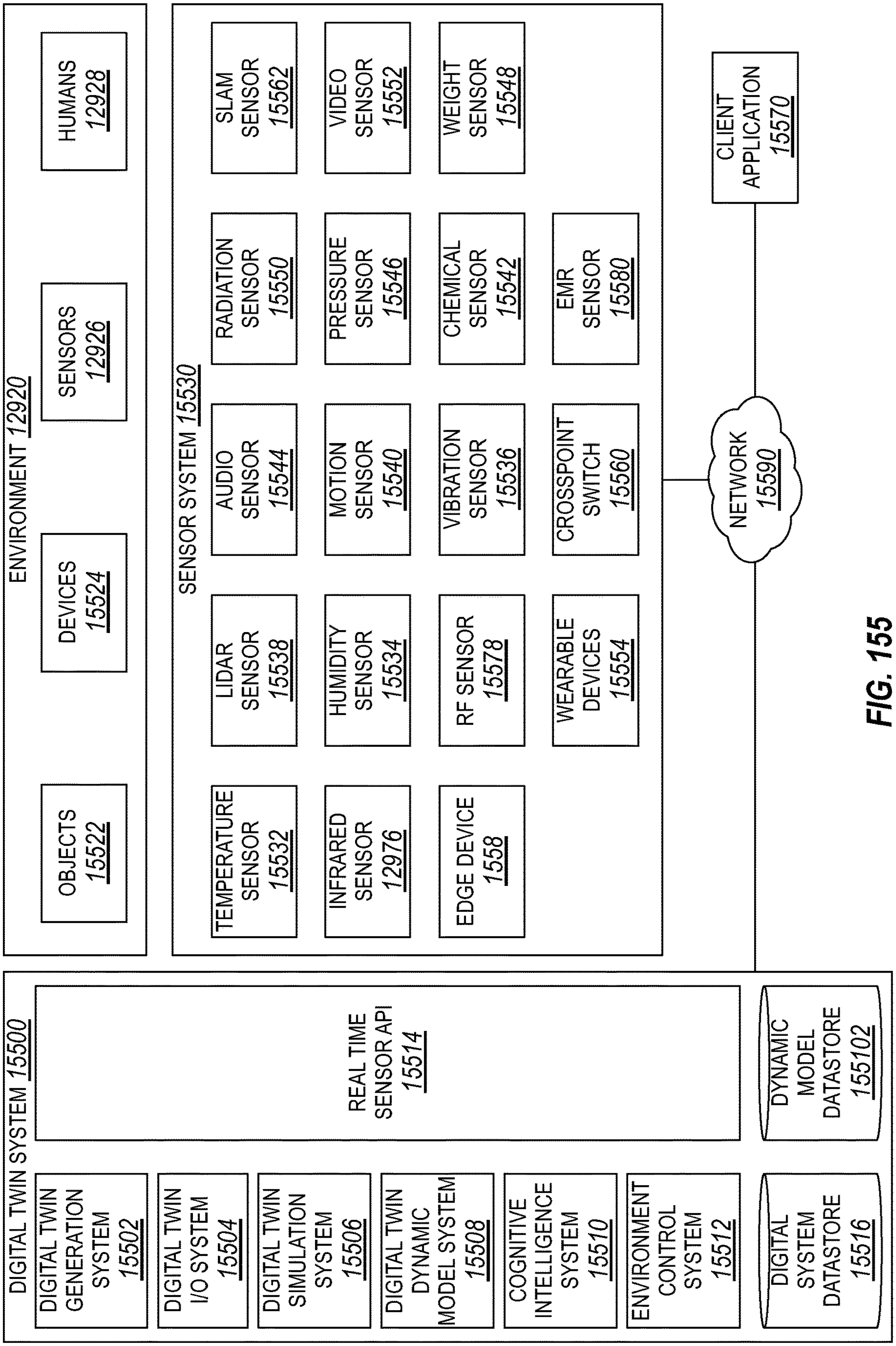

FIG. 155 illustrates an example environment of a digital twin system 15500. In embodiments, the digital twin system 15500 generates a set of digital twins of a set of industrial environments 15520 and/or industrial entities within the set of industrial environments. In embodiments, the digital twin system 15500 maintains a set of states of the respective industrial environments 15520, such as using sensor data obtained from respective sensor systems 15530 that monitor the industrial environments 15520. In embodiments, the digital twin system 15500 may include a digital twin management system 15502, a digital twin I/O system 15504, a digital twin simulation system 15506, a digital twin dynamic model system 15508, a cognitive intelligence system 15510, and/or an environment control module 15512. In embodiments, the digital twin system 15500 may provide a real time sensor API that provides a set of capabilities for enabling a set of interfaces for the sensors of the respective sensor systems 15530. In embodiments, the digital twin system 15500 may include and/or employ other suitable APIs, brokers, connectors, bridges, gateways, hubs, ports, routers, switches, data integration systems, peer-to-peer systems, and the like to facilitate the transferring of data to and from the digital twin system 15500. In these embodiments, these connective components may allow an IoT sensor or an intermediary device (e.g., a relay, an edge device, a switch, or the like) within a sensor system 15530 to communicate data to the digital twin system 15500 and/or to receive data (e.g., configuration data, control data, or the like) from the digital twin system 15500 or another external system. In embodiments, the digital twin system 15500 may further include a digital twin datastore 15516 that stores digital twins 15518 of various industrial environments 15520 and the objects 15522, devices 15524, sensors 15526, and/or humans 15528 in the environment 15520.

A digital twin may refer to a digital representation of one or more industrial entities, such as an industrial environment 15520, a physical object 15522, a device 15524, a sensor 15526, a human 15528, or any combination thereof. Examples of industrial environments 15520 include, but are not limited to, a factory, a power plant, a food production facility (which may include an inspection facility), a commercial kitchen, an indoor growing facility, a natural resources excavation site (e.g., a mine, an oil field, etc.), and the like. Depending on the type of environment, the types of objects, devices, and sensors that are found in the environments will differ. Non-limiting examples of physical objects 15522 include raw materials, manufactured products, excavated materials, containers (e.g., boxes, dumpsters, cooling towers, vats, pallets, barrels, palates, bins, and the like), furniture (e.g., tables, counters, workstations, shelving, etc.), and the like. Non-limiting examples of devices 15524 include robots, computers, vehicles (e.g., cars, trucks, tankers, trains, forklifts, cranes, etc.), machinery/equipment (e.g., tractors, tillers, drills, presses, assembly lines, conveyor belts, etc.), and the like. The sensors 15526 may be any sensor devices and/or sensor aggregation devices that are found in a sensor system 15530 within an environment. Non-limiting examples of sensors 15526 that may be implemented in a sensor system 15530 may include temperature sensors 15532, humidity sensors 15534, vibration sensors 15536, LIDAR sensors 15538, motion sensors 15540, chemical sensors 15542, audio sensors 15544, pressure sensors 15546, weight sensors 15548, radiation sensors 15550, video sensors 15552, wearable devices 15554, relays 15556, edge devices 15558, crosspoint switches 15560, and/or any other suitable sensors. Examples of different types of physical objects 15522, devices 15524, sensors 15526, and environments 15520 are referenced throughout the disclosure.

In some embodiments, on-device sensor fusion and data storage for industrial IoT devices is supported, including on-device sensor fusion and data storage for an industrial IoT device, where data from multiple sensors is multiplexed at the device for storage of a fused data stream. For example, pressure and temperature data may be multiplexed into a data stream that combines pressure and temperature in a time series, such as in a byte-like structure (where time, pressure, and temperature are bytes in a data structure, so that pressure and temperature remain linked in time, without requiring separate processing of the streams by outside systems), or by adding, dividing, multiplying, subtracting, or the like, such that the fused data can be stored on the device. Any of the sensor data types described throughout this disclosure, including vibration data, can be fused in this manner, and stored in a local data pool, in storage, or on an IoT device, such as a data collector, a component of a machine, or the like.

In some embodiments, a set of digital twins may represent an entire organization, such as energy production organizations, oil and gas organizations, renewable energy production organizations, aerospace manufacturers, vehicle manufacturers, heavy equipment manufacturers, mining organizations, drilling organizations, offshore platform organizations, and the like. In these examples, the digital twins may include digital twins of one or more industrial facilities of the organization.

In embodiments, the digital twin management system 15502 generates digital twins. A digital twin may be comprised of (e.g., via reference) other digital twins. In this way, a discrete digital twin may be comprised of a set of other discrete digital twins. For example, a digital twin of a machine may include digital twins of sensors on the machine, digital twins of components that make up the machine, digital twins of other devices that are incorporated in or integrated with the machine (such as systems that provide inputs to the machine or take outputs from it), and/or digital twins of products or other items that are made by the machine. Taking this example one step further, a digital twin of an industrial facility (e.g., a factory) may include a digital twin representing the layout of the industrial facility, including the arrangement of physical assets and systems in or around the facility, as well as digital assets of the assets within the facility (e.g., the digital twin of the machine), as well as digital twins of storage areas in the facility, digital twins of humans collecting vibration measurements from machines throughout the facility, and the like. In this second example, the digital twin of the industrial facility may reference the embedded digital twins, which may then reference other digital twins embedded within those digital twins.

In some embodiments, a digital twin may represent abstract entities, such as workflows and/or processes, including inputs, outputs, sequences of steps, decision points, processing loops, and the like that make up such workflows and processes. For example, a digital twin may be a digital representation of a manufacturing process, a logistics workflow, an agricultural process, a mineral extraction process, or the like. In these embodiments, the digital twin may include references to the industrial entities that are included in the workflow or process. The digital twin of the manufacturing process may reflect the various stages of the process. In some of these embodiments, the digital twin system 15500 receives real-time data from the industrial facility (e.g., from a sensor system 15530 of the environment 15520) in which the manufacturing process takes place and reflects a current (or substantially current) state of the process in real-time.

In embodiments, the digital representation may include a set of data structures (e.g., classes) that collectively define a set of properties of a represented physical object 15522, device 15524, sensor 15526, or environment 15520 and/or possible behaviors thereof. For example, the set of properties of a physical object 15522 may include a type of the physical object, the dimensions of the object, the mass of the object, the density of the object, the material(s) of the object, the physical properties of the material(s), the surface of the physical object, the status of the physical object, a location of the physical object, identifiers of other digital twins contained within the object, and/or other suitable properties. Examples of behavior of a physical object may include a state of the physical object (e.g., a solid, liquid, or gas), a melting point of the physical object, a density of the physical object when in a liquid state, a viscosity of the physical object when in a liquid state, a freezing point of the physical object, a density of the physical object when in a solid state, a hardness of the physical object when in a solid state, the malleability of the physical object, the buoyancy of the physical object, the conductivity of the physical object, a burning point of the physical object, the manner by which humidity affects the physical object, the manner by which water or other liquids affect the physical object, a terminal velocity of the physical object, and the like. In another example, the set of properties of a device may include a type of the device, the dimensions of the device, the mass of the device, the density of the density of the device, the material(s) of the device, the physical properties of the material(s), the surface of the device, the output of the device, the status of the device, a location of the device, a trajectory of the device, vibration characteristics of the device, identifiers of other digital twins that the device is connected to and/or contains, and the like. Examples of the behaviors of a device may include a maximum acceleration of a device, a maximum speed of a device, ranges of motion of a device, a heating profile of a device, a cooling profile of a device, processes that are performed by the device, operations that are performed by the device, and the like. Example properties of an environment may include the dimensions of the environment, the boundaries of the environment, the temperature of the environment, the humidity of the environment, the airflow of the environment, the physical objects in the environment, currents of the environment (if a body of water), and the like. Examples of behaviors of an environment may include scientific laws that govern the environment, processes that are performed in the environment, rules or regulations that must be adhered to in the environment, and the like.

In embodiments, the properties of a digital twin may be adjusted. For example, the temperature of a digital twin, a humidity of a digital twin, the shape of a digital twin, the material of a digital twin, the dimensions of a digital twin, or any other suitable parameters may be adjusted. As the properties of the digital twin are adjusted, other properties may be affected as well. For example, if the temperature of an environment 15520 is increased, the pressure within the environment may increase as well, such as a pressure of a gas in accordance with the ideal gas law. In another example, if a digital twin of a subzero environment is increased to above freezing temperatures, the properties of an embedded twin of water in a solid state (i.e., ice) may change into a liquid state over time.

Digital twins may be represented in a number of different forms. In embodiments, a digital twin may be a visual digital twin that is rendered by a computing device, such that a human user can view digital representations of an environment 15520 and/or the physical objects 15522, devices 15524, and/or the sensors 15526 within an environment. In embodiments, the digital twin may be rendered and output to a display device. In some of these embodiments, the digital twin may be rendered in a graphical user interface, such that a user may interact with the digital twin. For example, a user may "drill down" on a particular element (e.g., a physical object or device) to view additional information regarding the element (e.g., a state of a physical object or device, properties of the physical object or device, or the like). In some embodiments, the digital twin may be rendered and output in a virtual reality display. For example, a user may view a 3D rendering of an environment (e.g., using monitor or a virtual reality headset). While doing so, the user may view/inspect digital twins of physical assets or devices in the environment.

In some embodiments, a data structure of the visual digital twins (i.e., digital twins that are configured to be displayed in a 2D or 3D manner) may include surfaces (e.g., splines, meshes, polygons meshes, or the like). In some embodiments, the surfaces may include texture data, shading information, and/or reflection data. In this way, a surface may be displayed in a more realistic manner. In some embodiments, such surfaces may be rendered by a visualization engine (not shown) when the digital twin is within a field of view and/or when existing in a larger digital twin (e.g., a digital twin of an industrial environment). In these embodiments, the digital twin system 15500 may render the surfaces of digital objects, whereby a rendered digital twin may be depicted as a set of adjoined surfaces.

In embodiments, a user may provide input that controls one or more properties of a digital twin via a graphical user interface. For example, a user may provide input that changes a property of a digital twin. In response, the digital twin system 15500 can calculate the effects of the changed property and may update the digital twin and any other digital twins affected by the change of the property.

In embodiments, a user may view processes being performed with respect to one or more digital twins (e.g., manufacturing of a product, extracting minerals from a mine or well, a livestock inspection line, and the like). In these embodiments, a user may view the entire process or specific steps within a process.

In some embodiments, a digital twin (and any digital twins embedded therein) may be represented in a non-visual representation (or "data representation"). In these embodiments, a digital twin and any embedded digital twins exist in a binary representation but the relationships between the digital twins are maintained. For example, in embodiments, each digital twin and/or the components thereof may be represented by a set of physical dimensions that define a shape of the digital twin (or component thereof). Furthermore, the data structure embodying the digital twin may include a location of the digital twin. In some embodiments, the location of the digital twin may be provided in a set of coordinates. For example, a digital twin of an industrial environment may be defined with respect to a coordinate space (e.g., a Cartesian coordinate space, a polar coordinate space, or the like). In embodiments, embedded digital twins may be represented as a set of one or more ordered triples (e.g., [x coordinate, y coordinate, z coordinates] or other vector-based representations). In some of these embodiments, each ordered triple may represent a location of a specific point (e.g., center point, top point, bottom point, or the like) on the industrial entity (e.g., object, device, or sensor) in relation to the environment in which the industrial entity resides. In some embodiments, a data structure of a digital twin may include a vector that indicates a motion of the digital twin with respect to the environment. For example, fluids (e.g., liquids or gasses) or solids may be represented by a vector that indicates a velocity (e.g., direction and magnitude of speed) of the entity represented by the digital twin. In embodiments, a vector within a twin may represent a microscopic subcomponent, such as a particle within a fluid, and a digital twin may represent physical properties, such as displacement, velocity, acceleration, momentum, kinetic energy, vibrational characteristics, thermal properties, electromagnetic properties, and the like.

In some embodiments, a set of two or more digital twins may be represented by a graph database that includes nodes and edges that connect the nodes. In some implementations, an edge may represent a spatial relationship (e.g., "abuts," "rests upon," "contains", and the like). In these embodiments, each node in the graph database represents a digital twin of an entity (e.g., an industrial entity) and may include the data structure defining the digital twin. In these embodiments, each edge in the graph database may represent a relationship between two entities represented by connected nodes. In some implementations, an edge may represent a spatial relationship (e.g., "abuts," "rests upon," "interlocks with", "bears", "contains", and the like). In embodiments, various types of data may be stored in a node or an edge. In embodiments, a node may store property data, state data, and/or metadata relating to a facility, system, subsystem, and/or component. Types of property data and state data will differ based on the entity represented by a node. For example, a node representing a robot may include property data that indicates a material of the robot, the dimensions of the robot (or components thereof), a mass of the robot, and the like. In this example, the state data of the robot may include a current pose of the robot, a location of the robot, and the like. In embodiments, an edge may store relationship data and metadata data relating to a relationship between two nodes. Examples of relationship data may include the nature of the relationship, whether the relationship is permanent (e.g., a fixed component would have a permanent relationship with the structure to which it is attached or resting on), and the like. In embodiments, an edge may include metadata concerning the relationship between two entities. For example, if a product was produced on an assembly line, one relationship that may be documented between a digital twin of the product and the assembly line may be "created by." In these embodiments, an example edge representing the "created by" relationship may include a timestamp indicating a date and time that the product was created. In another example, a sensor may take measurements relating to a state of a device, whereby one relationship between the sensor and the device may include "measured" and may define a measurement type that is measured by the sensor. In this example, the metadata stored in an edge may include a list of N measurements taken and a timestamp of each respective measurement. In this way, temporal data relating to the nature of the relationship between two entities may be maintained, thereby allowing for an analytics engine, machine-learning engine, and/or visualization engine to leverage such temporal relationship data, such as by aligning disparate data sets with a series of points in time, such as to facilitate cause-and-effect analysis used for prediction systems.

In some embodiments, a graph database may be implemented in a hierarchical manner, such that the graph database relates a set of facilities, systems, and components. For example, a digital twin of a manufacturing environment may include a node representing the manufacturing environment. The graph database may further include nodes representing various systems within the manufacturing environment, such as nodes representing an HVAC system, a lighting system, a manufacturing system, and the like, all of which may connect to the node representing the manufacturing system. In this example, each of the systems may further connect to various subsystems and/or components of the system. For example, within the HVAC system, the HVAC system may connect to a subsystem node representing a cooling system of the facility, a second subsystem node representing a heating system of the facility, a third subsystem node representing the fan system of the facility, and one or more nodes representing a thermostat of the facility (or multiple thermostats). Carrying this example further, the subsystem nodes and/or component nodes may connect to lower level nodes, which may include subsystem nodes and/or component nodes. For example, the subsystem node representing the cooling subsystem may be connected to a component node representing an air conditioner unit. Similarly, a component node representing a thermostat device may connect to one or more component nodes representing various sensors (e.g., temperature sensors, humidity sensors, and the like).

In embodiments, where a graph database is implemented, a graph database may relate to a single environment or may represent a larger enterprise. In the latter scenario, a company may have various manufacturing and distribution facilities. In these embodiments, an enterprise node representing the enterprise may connect to environment nodes of each respective facility. In this way, the digital twin system 15500 may maintain digital twins for multiple industrial facilities of an enterprise.

In embodiments, the digital twin system 15500 may use a graph database to generate a digital twin that may be rendered and displayed and/or may be represented in a data representation. In the former scenario, the digital twin system 15500 may receive a request to render a digital twin, whereby the request includes one or more parameters that are indicative of a view that will be depicted. For example, the one or more parameters may indicate an industrial environment to be depicted and the type of rendering (e.g., "real-world view" that depicts the environment as a human would see it, an "infrared view" that depicts objects as a function of their respective temperature, an "airflow view" that depicts the airflow in a digital twin, or the like). In response, the digital twin system 15500 may traverse a graph database and may determine a configuration of the environment to be depicted based on the nodes in the graph database that are related (either directly or through a lower level node) to the environment node of the environment and the edges that define the relationships between the related nodes. Upon determining a configuration, the digital twin system 15500 may identify the surfaces that are to be depicted and may render those surfaces. The digital twin system 15500 may then render the requested digital twin by connecting the surfaces in accordance with the configuration. The rendered digital twin may then be output to a viewing device (e.g., VR headset, monitor, or the like). In some scenarios, the digital twin system 15500 may receive real-time sensor data from a sensor system 15530 of an environment 15520 and may update the visual digital twin based on the sensor data. For example, the digital twin system 1550 may receive sensor data (e.g., vibration data from a vibration sensor 15536) relating to a motor and its set of bearings. Based on the sensor data, the digital twin system 15500 may update the visual digital twin to indicate the approximate vibrational characteristics of the set of bearings within a digital twin of the motor.

In scenarios where the digital twin system 15500 is providing data representations of digital twins (e.g., for dynamic modeling, simulations, machine learning), the digital twin system 15500 may traverse a graph database and may determine a configuration of the environment to be depicted based on the nodes in the graph database that are related (either directly or through a lower level node) to the environment node of the environment and the edges that define the relationships between the related nodes. In some scenarios, the digital twin system 15500 may receive real-time sensor data from a sensor system 15530 of an environment 15520 and may apply one or more dynamic models to the digital twin based on the sensor data. In other scenarios, a data representation of a digital twin may be used to perform simulations, as is discussed in greater detail throughout the specification.

In some embodiments, the digital twin system 15500 may execute a digital ghost that is executed with respect to a digital twin of an industrial environment. In these embodiments, the digital ghost may monitor one or more sensors of a sensor system 15530 of an industrial environment to detect anomalies that may indicate a malicious virus or other security issues.

As discussed, the digital twin system 15500 may include a digital twin management system 15502, a digital twin I/O system 15504, a digital twin simulation system 15506, a digital twin dynamic model system 15508, a cognitive intelligence system 15510, and/or an environment control system 15512.

In embodiments, the digital twin management system 15502 creates new digital twins, maintains/updates existing digital twins, and/or renders digital twins. The digital twin management system 15502 may receive user input, uploaded data, and/or sensor data to create and maintain existing digital twins. Upon creating a new digital twin, the digital twin management system 15502 may store the digital twin in the digital twin datastore 15516. Creating, updating, and rendering digital twins are discussed in greater detail throughout the disclosure.

In embodiments, the digital twin I/O system 15504 receives input from various sources and outputs data to various recipients. In embodiments, the digital twin I/O system receives sensor data from one or more sensor systems 15530. In these embodiments, each sensor system 15530 may include one or more IoT sensors that output respective sensor data. Each sensor may be assigned an IP address or may have another suitable identifier. Each sensor may output sensor packets that include an identifier of the sensor and the sensor data. In some embodiments, the sensor packets may further include a timestamp indicating a time at which the sensor data was collected. In some embodiments, the digital twin I/O system 15504 may interface with a sensor system 15530 via the real-time sensor API 15514. In these embodiments, one or more devices (e.g., sensors, aggregators, edge devices) in the sensor system 15530 may transmit the sensor packets containing sensor data to the digital twin I/O system 15504 via the API. The digital twin I/O system may determine the sensor system 15530 that transmitted the sensor packets and the contents thereof, and may provide the sensor data and any other relevant data (e.g., time stamp, environment identifier/sensor system identifier, and the like) to the digital twin management system 15502.

In embodiments, the digital twin I/O system 15504 may receive imported data from one or more sources. For example, the digital twin system 15500 may provide a portal for users to create and manage their digital twins. In these embodiments, a user may upload one or more files (e.g., image files, LIDAR scans, blueprints, and the like) in connection with a new digital twin that is being created. In response, the digital twin I/O system 15504 may provide the imported data to the digital twin management system 15502. The digital twin I/O system 15504 may receive other suitable types of data without departing from the scope of the disclosure.

In some embodiments, the digital twin simulation system 15506 is configured to execute simulations using the digital twin. For example, the digital twin simulation system 15506 may iteratively adjust one or more parameters of a digital twin and/or one or more embedded digital twins. In embodiments, the digital twin simulation system 15506, for each set of parameters, executes a simulation based on the set of parameters and may collect the simulation outcome data resulting from the simulation. Put another way, the digital twin simulation system 15506 may collect the properties of the digital twin and the digital twins within or containing the digital twin used during the simulation as well as any outcomes stemming from the simulation. For example, in running a simulation on a digital twin of an indoor agricultural facility, the digital twin simulation system 15506 can vary the temperature, humidity, airflow, carbon dioxide and/or other relevant parameters and can execute simulations that output outcomes resulting from different combinations of the parameters. In another example, the digital twin simulation system 15506 may simulate the operation of a specific machine within an industrial facility that produces an output given a set of inputs. In some embodiments, the inputs may be varied to determine an effect of the inputs on the machine and the output thereof. In another example, the digital twin simulation system 15506 may simulate the vibration of a machine and/or machine components. In this example, the digital twin of the machine may include a set of operating parameters, interfaces, and capabilities of the machine. In some embodiments, the operating parameters may be varied to evaluate the effectiveness of the machine. The digital twin simulation system 15506 is discussed in further detail throughout the disclosure.

In embodiments, the digital twin dynamic model system 15508 is configured to model one or more behaviors with respect to a digital twin of an environment. In embodiments, the digital twin dynamic model system 15508 may receive a request to model a certain type of behavior regarding an environment or a process and may model that behavior using a dynamic model, the digital twin of the environment or process, and sensor data collected from one or more sensors that are monitoring the environment or process. For example, an operator of a machine having bearings may wish to model the vibration of the machine and bearings to determine whether the machine and/or bearings can withstand an increase in output. In this example, the digital twin dynamic model system 15508 may execute a dynamic model that is configured to determine whether an increase in output would result in adverse consequences (e.g., failures, downtime, or the like). The digital twin dynamic model system 15508 is discussed in further detail throughout the disclosure.

In embodiments, the cognitive processes system 15510 performs machine learning and artificial intelligence related tasks on behalf of the digital twin system. In embodiments, the cognitive processes system 15510 may train any suitable type of model, including but not limited to various types of neural networks, regression models, random forests, decision trees, Hidden Markov models, Bayesian models, and the like. In embodiments, the cognitive processes system 15510 trains machine learned models using the output of simulations executed by the digital twin simulation system 15506. In some of these embodiments, the outcomes of the simulations may be used to supplement training data collected from real-world environments and/or processes. In embodiments, the cognitive processes system 15510 leverages machine learned models to make predictions, identifications, classifications and provide decision support relating to the real-world environments and/or processes represented by respective digital twins.

For example, a machine-learned prediction model may be used to predict the cause of irregular vibrational patterns (e.g., a suboptimal, critical, or alarm vibration fault state) for a bearing of an engine in an industrial facility. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination of simulation data and real-world data of causes of irregular vibration patterns) to predict the cause of the irregular vibration patterns. In this example, the causes of the irregular vibrational patterns could be a loose bearing, a lack of bearing lubrication, a bearing that is out of alignment, a worn bearing, the phase of the bearing may be aligned with the phase of the engine, loose housing, loose bolt, and the like.

In another example, a machine-learned model may be used to provide decision support to bring a bearing of an engine in an industrial facility operating at a suboptimal vibration fault level state to a normal operation vibration fault level state. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination of simulation data and real-world data of solutions to irregular vibration patterns) to provide decision support in achieving a normal operation fault level state of the bearing. In this example, the decision support could be a recommendation to tighten the bearing, lubricate the bearing, re-align the bearing, order a new bearing, order a new part, collect additional vibration measurements, change operating speed of the engine, tighten housings, tighten bolts, and the like.

In another example, a machine-learned model may be used to provide decision support relating to vibration measurement collection by a worker. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination of simulation data and real-world vibration measurement history data) to provide decision support in selecting vibration measurement locations.

In yet another example, a machine-learned model may be used to identify vibration signatures associated with machine and/or machine component problems. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination of simulation data and real-world vibration measurement history data) to identify vibration signatures associated with a machine and/or machine component. The foregoing examples are non-limiting examples and the cognitive processes system 15510 may be used for any other suitable AI/machine-learning related tasks that are performed with respect to industrial facilities.

In embodiments, the environment control system 15512 controls one or more aspects of industrial facilities. In some of these embodiments, the environment control system 15512 may control one or more devices within an industrial environment. For example, the environment control system 15512 may control one or more machines within an environment, robots within an environment, an HVAC system of the environment, an alarm system of the environment, an assembly line in an environment, or the like. In embodiments, the environment control system 15512 may leverage the digital twin simulation system 15506, the digital twin dynamic model system 15508, and/or the cognitive processes system 15510 to determine one or more control instructions. In embodiments, the environment control system 15512 may implement a rules-based and/or a machine-learning approach to determine the control instructions. In response to determining a control instruction, the environment control system 15512 may output the control instruction to the intended device within a specific environment via the digital twin I/O system 15504.

Figure 156:
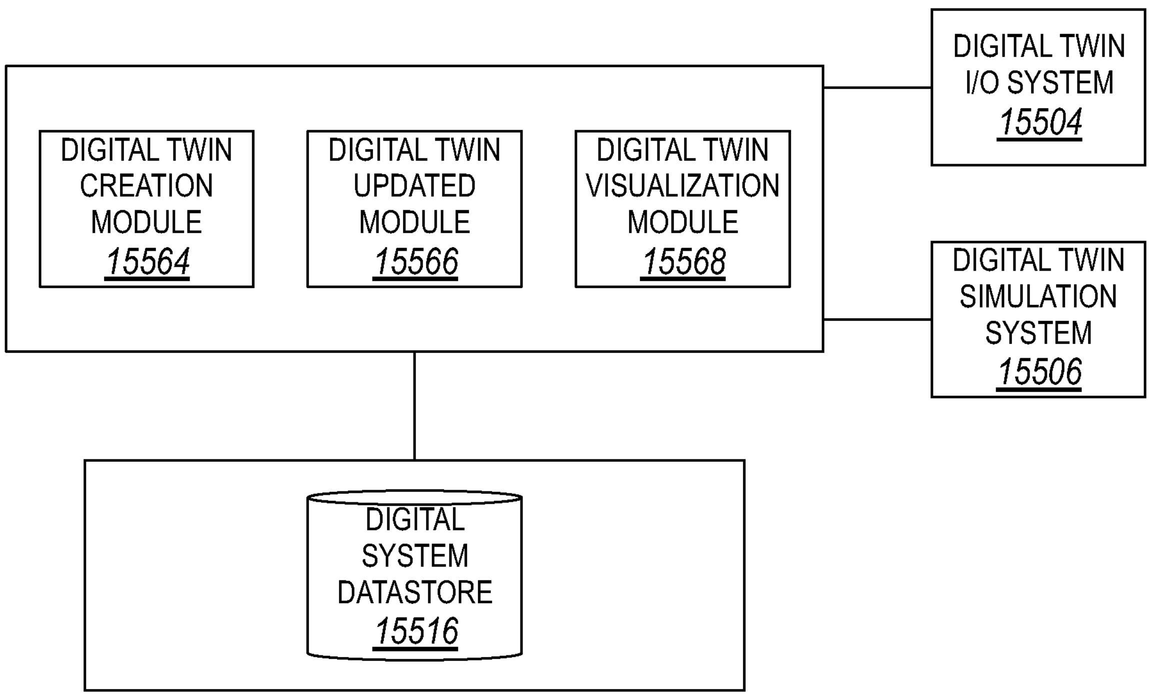

FIG. 156 illustrates an example digital twin management system 15502 according to some embodiments of the present disclosure. In embodiments, the digital twin management system 15502 may include, but is not limited to, a digital twin creation module 15564, a digital twin update module 15566, and a digital twin visualization module 15568.

In embodiments, the digital twin creation module 15564 may create a set of new digital twins of a set of environments using input from users, imported data (e.g., blueprints, specifications, and the like), image scans of the environment, 3D data from a LIDAR device and/or SLAM sensor, and other suitable data sources. For example, a user (e.g., a user affiliated with an organization/customer account) may, via a client application 15570, provide input to create a new digital twin of an environment. In doing so, the user may upload 2D or 3D image scans of the environment and/or a blueprint of the environment. The user may also upload 3D data, such as taken by a camera, a LIDAR device, an IR scanner, a set of SLAM sensors, a radar device, an EMF scanner, or the like. In response to the provided data, the digital twin creation module 15564 may create a 3D representation of the environment, which may include any objects that were captured in the image data/detected in the 3D data. In embodiments, the cognitive processes system 15572 may analyze input data (e.g., blueprints, image scans, 3D data) to classify rooms, pathways, equipment, and the like to assist in the generation of the 3D representation. In some embodiments, the digital twin creation module 15564 may map the digital twin to a 3D coordinate space (e.g., a Cartesian space having x, y, and z axes).

In some embodiments, the digital twin creation module 15564 may output the 3D representation of the environment to a graphical user interface (GUI). In some of these embodiments, a user may identify certain areas and/or objects and may provide input relating to the identified areas and/or objects. For example, a user may label specific rooms, equipment, machines, and the like. Additionally or alternatively, the user may provide data relating to the identified objects and/or areas. For example, in identifying a piece of equipment, the user may provide a make/model number of the equipment. In some embodiments, the digital twin creation module 15564 may obtain information from a manufacturer of a device, a piece of equipment, or machinery. This information may include one or more properties and/or behaviors of the device, equipment, or machinery. In some embodiments, the user may, via the GUI, identify locations of sensors throughout the environment. For each sensor, the user may provide a type of sensor and related data (e.g., make, model, IP address, and the like). The digital twin creation module 15564 may record the locations (e.g., the x, y, z coordinates of the sensors) in the digital twin of the environment. In embodiments, the digital twin system 15500 may employ one or more systems that automate the population of digital twins. For example, the digital twin system 15500 may employ a machine vision-based classifier that classifies makes and models of devices, equipment, or sensors. Additionally or alternatively, the digital twin system 15500 may iteratively ping different types of known sensors to identify the presence of specific types of sensors that are in an environment. Each time a sensor responds to a ping, the digital twin system 15500 may extrapolate the make and model of the sensor.

In some embodiments, the manufacturer may provide or make available digital twins of their products (e.g., sensors, devices, machinery, equipment, raw materials, and the like). In these embodiments, the digital twin creation module 15564 may import the digital twins of one or more products that are identified in the environment and may embed those digital twins in the digital twin of the environment. In embodiments, embedding a digital twin within another digital twin may include creating a relationship between the embedded digital twin with the other digital twin. In these embodiments, the manufacturer of the digital twin may define the behaviors and/or properties of the respective products. For example, a digital twin of a machine may define the manner by which the machine operates, the inputs/outputs of the machine, and the like. In this way, the digital twin of the machine may reflect the operation of the machine given a set of inputs.

In embodiments, a user may define one or more processes that occur in an environment. In these embodiments, the user may define the steps in the process, the machines/devices that perform each step in the process, the inputs to the process, and the outputs of the process.

In embodiments, the digital twin creation module 15564 may create a graph database that defines the relationships between a set of digital twins. In these embodiments, the digital twin creation module 15564 may create nodes for the environment, systems and subsystems of the environment, devices in the environment, sensors in the environment, workers that work in the environment, processes that are performed in the environment, and the like. In embodiments, the digital twin creation module 15564 may write the graph database representing a set of digital twins to the digital twin datastore 15516.

In embodiments, the digital twin creation module 15564 may, for each node, include any data relating to the entity in the node representing the entity. For example, in defining a node representing an environment, the digital twin creation module 15564 may include the dimensions, boundaries, layout, pathways, and other relevant spatial data in the node. Furthermore, the digital twin creation module 15564 may define a coordinate space with respect to the environment. In the case that the digital twin may be rendered, the digital twin creation module 15564 may include a reference in the node to any shapes, meshes, splines, surfaces, and the like that may be used to render the environment. In representing a system, subsystem, device, or sensor, the digital twin creation module 15564 may create a node for the respective entity and may include any relevant data. For example, the digital twin creation module 15564 may create a node representing a machine in the environment. In this example, the digital twin creation module 15564 may include the dimensions, behaviors, properties, location, and/or any other suitable data relating to the machine in the node representing the machine. The digital twin creation module 15564 may connect nodes of related entities with an edge, thereby creating a relationship between the entities. In doing so, the created relationship between the entities may define the type of relationship characterized by the edge. In representing a process, the digital twin creation module 15564 may create a node for the entire process or may create a node for each step in the process. In some of these embodiments, the digital twin creation module 15564 may relate the process nodes to the nodes that represent the machinery/devices that perform the steps in the process. In embodiments, where an edge connects the process step nodes to the machinery/device that performs the process step, the edge or one of the nodes may contain information that indicates the input to the step, the output of the step, the amount of time the step takes, the nature of processing of inputs to produce outputs, a set of states or modes the process can undergo, and the like.

In embodiments, the digital twin update module 15566 updates sets of digital twins based on a current status of one or more industrial entities. In some embodiments, the digital twin update module 15566 receives sensor data from a sensor system 15530 of an industrial environment and updates the status of the digital twin of the industrial environment and/or digital twins of any affected systems, subsystems, devices, workers, processes, or the like. As discussed, the digital twin I/O system 15504 may receive the sensor data in one or more sensor packets. The digital twin I/O system 15504 may provide the sensor data to the digital twin update module 15566 and may identify the environment from which the sensor packets were received and the sensor that provided the sensor packet. In response to the sensor data, the digital twin update module 15566 may update a state of one or more digital twins based on the sensor data. In some of these embodiments, the digital twin update module 15566 may update a record (e.g., a node in a graph database) corresponding to the sensor that provided the sensor data to reflect the current sensor data. In some scenarios, the digital twin update module 15566 may identify certain areas within the environment that are monitored by the sensor and may update a record (e.g., a node in a graph database) to reflect the current sensor data. For example, the digital twin update module 15566 may receive sensor data reflecting different vibrational characteristics of a machine and/or machine components. In this example, the digital twin update module 15566 may update the records representing the vibration sensors that provided the vibration sensor data and/or the records representing the machine and/or the machine components to reflect the vibration sensor data. In another example, in some scenarios, workers in an industrial environment (e.g., manufacturing facility, industrial storage facility, a mine, a drilling operation, or the like) may be required to wear wearable devices (e.g., smart watches, smart helmets, smart shoes, or the like). In these embodiments, the wearable devices may collect sensor data relating to the worker (e.g., location, movement, heartrate, respiration rate, body temperature, or the like) and/or the environment surrounding the worker and may communicate the collected sensor data to the digital twin system 15500 (e.g., via the real-time sensor API 15514) either directly or via an aggregation device of the sensor system. In response to receiving the sensor data from the wearable device of a worker, the digital twin update module 15566 may update a digital twin of a worker to reflect, for example, a location of the worker, a trajectory of the worker, a health status of the worker, or the like. In some of these embodiments, the digital twin update module 15566 may update a node representing a worker and/or an edge that connects the node representing the environment with the collected sensor data to reflect the current status of the worker.

In some embodiments, the digital twin update module 15566 may provide the sensor data from one or more sensors to the digital twin dynamic model system 15508, which may model a behavior of the environment and/or one or more industrial entities to extrapolate additional state data.

In embodiments, the digital twin visualization module 15568 receives requests to view a visual digital twin or a portion thereof. In embodiments, the request may indicate the digital twin to be viewed (e.g., an environment identifier) . In response, the digital twin visualization module 15568 may determine the requested digital twin and any other digital twins implicated by the request. For example, in requesting to view a digital twin of an environment, the digital twin visualization module 15568 may further identify the digital twins of any industrial entities within the environment. In embodiments, the digital twin visualization module 15568 may identify the spatial relationships between the industrial entities and the environment based on, for example, the relationships defined in a graph database. In these embodiments, the digital twin visualization module 15568 can determine the relative location of embedded digital twins within the containing digital twin, relative locations of adjoining digital twins, and/or the transience of the relationship (e.g., is an object fixed to a point or does the object move). The digital twin visualization module 15568 may render the requested digital twins and any other implicated digital twin based on the identified relationships. In some embodiments, the digital twin visualization module 15568 may, for each digital twin, determine the surfaces of the digital twin. In some embodiments, the surfaces of a digital may be defined or referenced in a record corresponding to the digital twin, which may be provided by a user, determined from imported images, or defined by a manufacturer of an industrial entity. In the scenario that an object can take different poses or shapes (e.g., an industrial robot), the digital twin visualization module 15568 may determine a pose or shape of the object for the digital twin. The digital twin visualization module 15568 may embed the digital twins into the requested digital twin and may output the requested digital twin to a client application.

In some of these embodiments, the request to view a digital twin may further indicate the type of view. As discussed, in some embodiments, digital twins may be depicted in a number of different view types. For example, an environment or device may be viewed in a "real-world" view that depicts the environment or device as they typically appear, in a "heat" view that depicts the environment or device in a manner that is indicative of a temperature of the environment or device, in a "vibration" view that depicts the machines and/or machine components in an industrial environment in a manner that is indicative of vibrational characteristics of the machines and/or machine components, in a "filtered" view that only displays certain types of objects within an environment or components of a device (such as objects that require attention resulting from, for example, recognition of a fault condition, an alert, an updated report, or other factor), an augmented view that overlays data on the digital twin, and/or any other suitable view types. In embodiments, digital twins may be depicted in a number of different role-based view types. For example, a manufacturing facility device may be viewed in an "operator" view that depicts the facility in a manner that is suitable for a facility operator, a "C-Suite" view that depicts the facility in a manner that is suitable for executive-level managers, a "marketing" view that depicts the facility in a manner that is suitable for workers in sales and/or marketing roles, a "board" view that depicts the facility in a manner that is suitable for members of a corporate board, a "regulatory" view that depicts the facility in a manner that is suitable for regulatory managers, and a "human resources" view that depicts the facility in a manner that is suitable for human resources personnel. In response to a request that indicates a view type, the digital twin visualization module 15568 may retrieve the data for each digital twin that corresponds to the view type. For example, if a user has requested a vibration view of a factory floor, the digital twin visualization module 15568 may retrieve vibration data for the factory floor (which may include vibration measurements taken from different machines and/or machine components and/or vibration measurements that were extrapolated by the digital twin dynamic model system 15508 and/or simulated vibration data from digital twin simulation system 15506) as well as available vibration data for any industrial entities appearing on the factory floor. In this example, the digital twin visualization module 15568 may determine colors corresponding to each machine component on a factory floor that represent a vibration fault level state (e.g., red for alarm, orange for critical, yellow for suboptimal, and green for normal operation). The digital twin visualization module 15568 may then render the digital twins of the machine components within the environment based on the determined colors.

Additionally or alternatively, the digital twin visualization module 15568 may render the digital twins of the machine components within the environment with indicators having the determined colors. For instance, if the vibration fault level state of an inbound bearing of a motor is suboptimal and the outbound bearing of the motor is critical, the digital twin visualization module 15568 may render the digital twin of the inbound bearing having an indicator in a shade of yellow (e.g., suboptimal) and the outbound bearing having an indicator in a shade of orange (e.g., critical). It is noted that in some embodiments, the digital twin system 15500 may include an analytics system (not shown) that determine the manner by which the digital twin visualization system 15500 presents information to a human user. For example, the analytics system may track outcomes relating to human interactions with real-world environments or objects in response to information presented in a visual digital twin. In some embodiments, the analytics system may apply cognitive models to determine the most effective manner to display visualized information (e.g., what colors to use to denote an alarm condition, what kind of movements or animations bring attention to an alarm condition, or the like) or audio information (what sounds to use to denote an alarm condition) based on the outcome data. In some embodiments, the analytics system may apply cognitive models to determine the most suitable manner to display visualized information based on the role of the user. In embodiments, the visualization may include display of information related to the visualized digital twins, including graphical information, graphical information depicting vibration characteristics, graphical information depicting harmonic peaks, graphical information depicting peaks, vibration severity units data, vibration fault level state data, recommendations from cognitive intelligence system 15510, predictions from cognitive intelligence system 15510, probability of failure data, maintenance history data, time to failure data, cost of downtime data, probability of downtime data, cost of repair data, cost of machine replace data, probability of shutdown data, manufacturing KPIs, and the like.

In another example, a user may request a filtered view of a digital twin of a process, whereby the digital twin of the process only shows components (e.g., machine or equipment) that are involved in the process. In this example, the digital twin visualization module 15568 may retrieve a digital twin of the process, as well as any related digital twins (e.g., a digital twin of the environment and digital twins of any machinery or devices that impact the process). The digital twin visualization module 15568 may then render each of the digital twins (e.g., the environment and the relevant industrial entities) and then may perform the process on the rendered digital twins. It is noted that as a process may be performed over a period of time and may include moving items and/or parts, the digital twin visualization module 15568 may generate a series of sequential frames that demonstrate the process. In this scenario, the movements of the machines and/or devices implicated by the process may be determined according to the behaviors defined in the respective digital twins of the machines and/or devices.

As discussed, the digital twin visualization module 15568 may output the requested digital twin to a client application 15570. In some embodiments, the client application 15570 is a virtual reality application, whereby the requested digital twin is displayed on a virtual reality headset. In some embodiments, the client application 15570 is an augmented reality application, whereby the requested digital twin is depicted in an AR-enabled device. In these embodiments, the requested digital twin may be filtered such that visual elements and/or text are overlaid on the display of the AR-enabled device.

It is noted that while a graph database is discussed, the digital twin system 15500 may employ other suitable data structures to store information relating to a set of digital twins. In these embodiments, the data structures, and any related storage system, may be implemented such that the data structures provide for some degree of feedback loops and/or recursion when representing iteration of flows.

Figure 157:
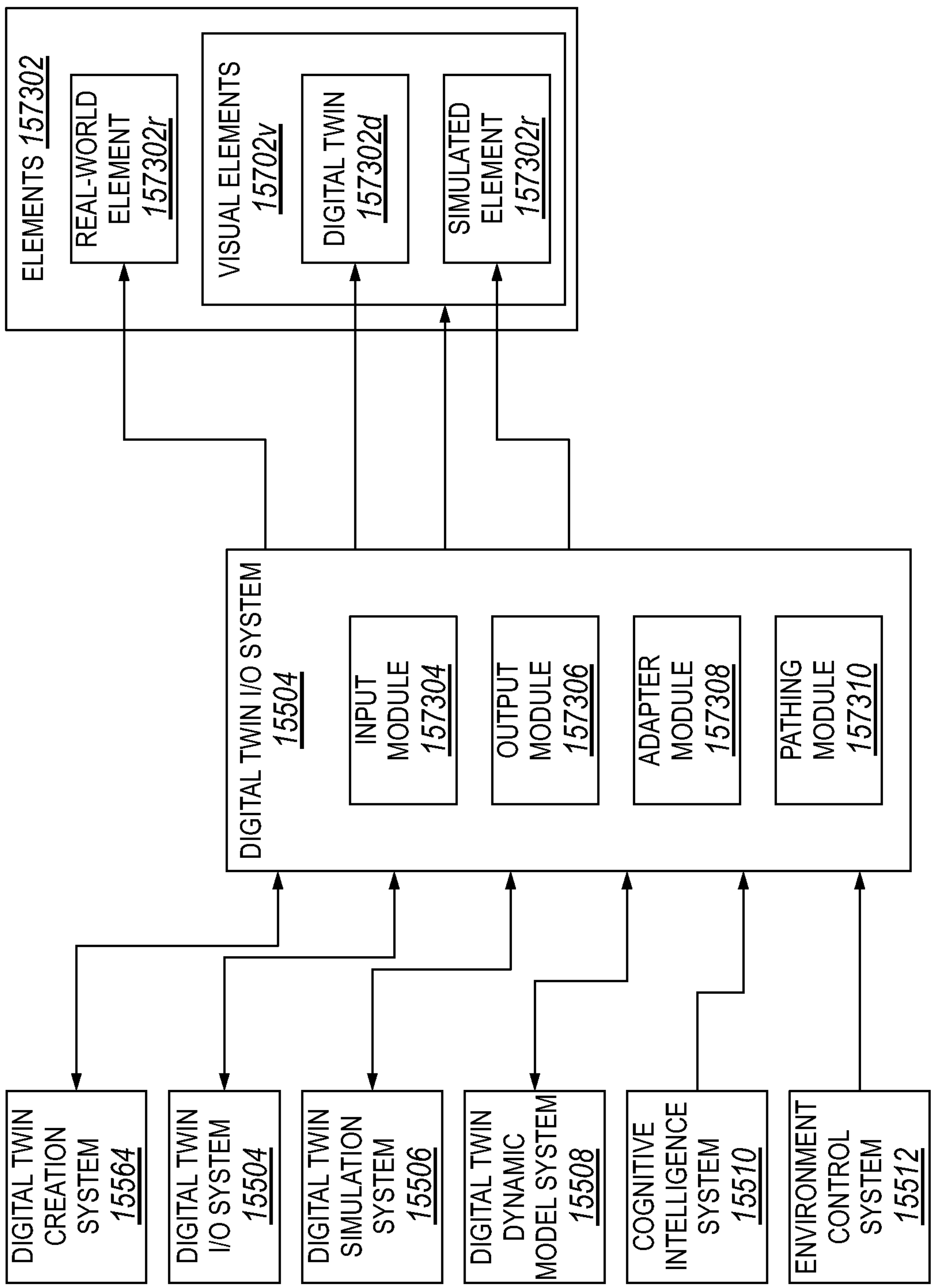

FIG. 157 illustrates an example of a digital twin I/O system 15504 that interfaces with the environment 15520, the digital twin system 15500, and/or components thereof to provide bi-directional transfer of data between coupled components according to some embodiments of the present disclosure.

In embodiments, the transferred data includes signals (e.g., request signals, command signals, response signals, etc.) between connected components, which may include software components, hardware components, physical devices, virtualized devices, simulated devices, combinations thereof, and the like. The signals may define material properties (e.g., physical quantities of temperature, pressure, humidity, density, viscosity, etc.), measured values (e.g., contemporaneous or stored values acquired by the device or system), device properties (e.g., device ID or properties of the device's design specifications, materials, measurement capabilities, dimensions, absolute position, relative position, combinations thereof, and the like), set points (e.g., targets for material properties, device properties, system properties, combinations thereof, and the like), and/or critical points (e.g., threshold values such as minimum or maximum values for material properties, device properties, system properties, etc.). The signals may be received from systems or devices that acquire (e.g., directly measure or generate) or otherwise obtain (e.g., receive, calculate, look-up, filter, etc.) the data, and may be communicated to or from the digital twin I/O system 15504 at predetermined times or in response to a request (e.g., polling) from the digital twin I/O system 15504. The communications may occur through direct or indirect connections (e.g., via intermediate modules within a circuit and/or intermediate devices between the connected components). The values may correspond to real-world elements 157302*r* (e.g., an input or output for a tangible vibration sensor) or virtual elements 157302*v* (e.g., an input or output for a digital twin 157302*d* and/or a simulated element 157302*s* that provide vibration data).

In embodiments, the real-world elements 157302*r* may be elements within the industrial environment 15520. The real-world elements 157302*r* may include, for example, non-networked objects 15522, the devices 15524 (smart or non-smart), sensors 15526, and humans 15528. The real-world elements 151302*r* may be process or non-process equipment within the industrial environments 15520. For example, process equipment may include motors, pumps, mills, fans, painters, welders, smelters, etc., and non-process equipment may include personal protective equipment, safety equipment, emergency stations or devices (e.g., safety showers, eyewash stations, fire extinguishers, sprinkler systems, etc.), warehouse features (e.g., walls, floor layout, etc.), obstacles (e.g., persons or other items within the environment 15520, etc.), etc.

In embodiments, the virtual elements 157302*v* may be digital representations of or that correspond to contemporaneously existing real-world elements 157302*r*. Additionally or alternatively, the virtual elements 157302*v* may be digital representations of or that correspond to real-world elements 157302*r* that may be available for later addition and implementation into the environment 15520. The virtual elements may include, for example, simulated elements 175302*s* and/or digital twins 157302*d*. In embodiments, the simulated elements 157302*s* may be digital representations of real-world elements 157302*s* that are not present within the industrial environment 15520. The simulated elements 157302*s* may mimic desired physical properties which may be later integrated within the environment 15520 as real-world elements 157302*r* (e.g., a "black box" that mimics the dimensions of a real-world elements 157302*r*). The simulated elements 157302*s* may include digital twins of existing objects (e.g., a single simulated element 151302*s* may include one or more digital twins 151302*d* for existing sensors). Information related to the simulated elements 157302*s* may be obtained, for example, by evaluating behavior of corresponding real-world elements 157302*r* using mathematical models or algorithms, from libraries that define information and behavior of the simulated elements 131302*s* (e.g., physics libraries, chemistry libraries, or the like).

In embodiments, the digital twin 157302*d* may be a digital representation of one or more real-world elements 157302*r*. The digital twins 157302*d* are configured to mimic, copy, and/or model behaviors and responses of the real-world elements 157302*r* in response to inputs, outputs, and/or conditions of the surrounding or ambient environment. Data related to physical properties and responses of the real-world elements 157302*r* may be obtained, for example, via user input, sensor input, and/or physical modeling (e.g., thermodynamic models, electrodynamic models, mechanodynamic models, etc.). Information for the digital twin 157302*d* may correspond to and be obtained from the one or more real-world elements 157302*r* corresponding to the digital twin 157302*d*. For example, in some embodiments, the digital twin 131302*d* may correspond to one real-world element 157302*r* that is a fixed digital vibration sensor 15536 on a machine component, and vibration data for the digital twin 131302*d* may be obtained by polling or fetching vibration data measured by the fixed digital vibration sensor on the machine component. In a further example, the digital twin 157302*d* may correspond to a plurality of real-world elements 157302*r* such that each of the elements can be a fixed digital vibration sensor on a machine component, and vibration data for the digital twin 157302*d* may be obtained by polling or fetching vibration data measured by each of the fixed digital vibration sensors on the plurality of real-world elements 157302*r*. Additionally or alternatively, vibration data of a first digital twin 157302*d* may be obtained by fetching vibration data of a second digital twin 157302*d* that is embedded within the first digital twin 157302*d*, and vibration data for the first digital twin 157302*d* may include or be derived from vibration data for the second digital twin 157302*d*. For example, the first digital twin may be a digital twin 157302*d* of an environment 15520 (alternatively referred to as an "environmental digital twin") and the second digital twin 157302*d* may be a digital twin 157302*d* corresponding to a vibration sensor disposed within the environment 15520 such that the vibration data for the first digital twin 157302*d* is obtained from or calculated based on data including the vibration data for the second digital twin 157302*d*.

In embodiments, the digital twin system 15500 monitors properties of the real-world elements 157302*r* using the sensors 15526 within a respective environment 15520 that is or may be represented by a digital twin 157302*d* and/or outputs of models for one or more simulated elements 157302*s*. In embodiments, the digital twin system 15500 may minimize network congestion while maintaining effective monitoring of processes by extending polling intervals and/or minimizing data transfer for sensors corresponding that correspond to affected real-world elements 157302*r* and performing simulations (e.g., via the digital-twin simulation system 15506) during the extended interval using data that was obtained from other sources (e.g., sensors that are physically proximate to or have an effect on the affected real-world elements 157302*r*). Additionally or alternatively, error checking may be performed by comparing the collected sensor data with data obtained from the digital-twin simulation system 15506. For example, consistent deviations or fluctuations between sensor data obtained from the real-world element 157302r and the simulated element 157302s may indicate malfunction of the respective sensor or another fault condition.

In embodiments, the digital twin system 15500 may optimize features of the environment through use of one or more simulated elements 157302s. For example, the digital twin system 15500 may evaluate effects of the simulated elements 157302s within a digital twin of an environment to quickly and efficiently determine costs and/or benefits flowing from inclusion, exclusion, or substitution of real-world elements 157302r within the environment 15520. The costs and benefits may include, for example, increased machinery costs (e.g., capital investment and maintenance), increased efficiency (e.g., process optimization to reduce waste or increase throughput), decreased or altered footprint within the environment 15520, extension or optimization of useful lifespans, minimization of component faults, minimization of component downtime, etc.

In embodiments, the digital twin I/O system 15504 may include one or more software modules that are executed by one or more controllers of one or more devices (e.g., server devices, user devices, and/or distributed devices) to affect the described functions. The digital twin I/O system 15504 may include, for example, an input module 157304, an output module 157306, and an adapter module 157308.

In embodiments, the input module 157304 may obtain or import data from data sources in communication with the digital twin I/O system 15504, such as the sensor system 15530 and the digital twin simulation system 15506. The data may be immediately used by or stored within the digital twin system 15500. The imported data may be ingested from data streams, data batches, in response to a triggering event, combinations thereof, and the like. The input module 157304 may receive data in a format that is suitable to transfer, read, and/or write information within the digital twin system 15500.

In embodiments, the output module 157306 may output or export data to other system components (e.g., the digital twin datastore 15516, the digital twin simulation system 15506, the cognitive intelligence system 15510, etc.), devices 15524, and/or the client application 15570. The data may be output in data streams, data batches, in response to a triggering event (e.g., a request), combinations thereof, and the like. The output module 157306 may output data in a format that is suitable to be used or stored by the target element (e.g., one protocol for output to the client application and another protocol for the digital twin datastore 15516).

In embodiments, the adapter module 157308 may process and/or convert data between the input module 157304 and the output module 157306. In embodiments, the adapter module 157308 may convert and/or route data automatically (e.g., based on data type) or in response to a received request (e.g., in response to information within the data).

In embodiments, the digital twin system 15500 may represent a set of industrial workpiece elements in a digital twin, and the digital twin simulation system 15506 simulates a set of physical interactions of a worker with the workpiece elements.

In embodiments, the digital twin simulation system 15506 may determine process outcomes for the simulated physical interactions accounting for simulated human factors. For example, variations in workpiece throughput may be modeled by the digital twin system 15500 including, for example, worker response times to events, worker fatigue, discontinuity within worker actions (e.g., natural variations in human-movement speed, differing positioning times, etc.), effects of discontinuities on downstream processes, and the like. In embodiments, individualized worker interactions may be modeled using historical data that is collected, acquired, and/or stored by the digital twin system 15500. The simulation may begin based on estimated amounts (e.g., worker age, industry averages, workplace expectations, etc.). The simulation may also individualize data for each worker (e.g., comparing estimated amounts to collected worker-specific outcomes).

In embodiments, information relating to workers (e.g., fatigue rates, efficiency rates, and the like) may be determined by analyzing performance of specific workers over time and modeling said performance.

In embodiments, the digital twin system 15500 includes a plurality of proximity sensors within the sensor system 15530. The proximity sensors are or may be configured to detect elements of the environment 15520 that are within a predetermined area. For example, proximity sensors may include electromagnetic sensors, light sensors, and/or acoustic sensors.

The electromagnetic sensors are or may be configured to sense objects or interactions via one or more electromagnetic fields (e.g., emitted electromagnetic radiation or received electromagnetic radiation). In embodiments, the electromagnetic sensors include inductive sensors (e.g., radio-frequency identification sensors), capacitive sensors (e.g., contact, and contactless capacitive sensors), combinations thereof, and the like.

The light sensors are or may be configured to sense objects or interactions via electromagnetic radiation in, for example, the far-infrared, near-infrared, optical, and/or ultraviolet spectra. In embodiments, the light sensors may include image sensors (e.g., charge-coupled devices and CMOS active-pixel sensors), photoelectric sensors (e.g., through-beam sensors, retroreflective sensors, and diffuse sensors), combinations thereof, and the like. Further, the light sensors may be implemented as part of a system or subsystem, such as a light detection and ranging ("LIDAR") sensor.

The acoustic sensors are or may be configured to sense objects or interactions via sound waves that are emitted and/or received by the acoustic sensors. In embodiments, the acoustic sensors may include infrasonic, sonic, and/or ultrasonic sensors. Further, the acoustic sensors may be grouped as part of a system or subsystem, such as a sound navigation and ranging ("SONAR") sensor.

In embodiments, the digital twin system 15500 stores and collects data from a set of proximity sensors within the environment 15520 or portions thereof. The collected data may be stored, for example, in the digital twin datastore 15516 for use by components the digital twin system 15500 and/or visualization by a user. Such use and/or visualization may occur contemporaneously with or after collection of the data (e.g., during later analysis and/or optimization of processes).

In embodiments, data collection may occur in response to a triggering condition. These triggering conditions may include, for example, expiration of a static or a dynamic predetermined interval, obtaining a value short of or in excess of a static or dynamic value, receiving an automatically generated request or instruction from the digital twin system 15500 or components thereof, interaction of an element with the respective sensor or sensors (e.g., in response to a worker or machine breaking a beam or coming within a predetermined distance from the proximity sensor), interaction of a user with a digital twin (e.g., selection of an environmental digital twin, a sensor array digital twin, or a sensor digital twin), combinations thereof, and the like.

In some embodiments, the digital twin system 15500 collects and/or stores RFID data in response to interaction of a worker with a real-world element 157302*r*. For example, in response to a worker interaction with a real-world environment, the digital twin will collect and/or store RFID data from RFID sensors within or associated with the corresponding environment 15520. Additionally or alternatively, worker interaction with a sensor-array digital twin will collect and/or store RFID data from RFID sensors within or associated with the corresponding sensor array. Similarly, worker interaction with a sensor digital twin will collect and/or store RFID data from the corresponding sensor. The RFID data may include suitable data attainable by RFID sensors such as proximate RFID tags, RFID tag position, authorized RFID tags, unauthorized RFID tags, unrecognized RFID tags, RFID type (e.g., active or passive), error codes, combinations thereof, and the like.

In embodiments, the digital twin system 15500 may further embed outputs from one or more devices within a corresponding digital twin. In embodiments, the digital twin system 15500 embeds output from a set of individual-associated devices into an industrial digital twin. For example, the digital twin I/O system 15504 may receive information output from one or more wearable devices 15554 or mobile devices (not shown) associated with an individual within an industrial environment. The wearable devices may include image capture devices (e.g., body cameras or augmented-reality headwear), navigation devices (e.g., GPS devices, inertial guidance systems), motion trackers, acoustic capture devices (e.g., microphones), radiation detectors, combinations thereof, and the like.

In embodiments, upon receiving the output information, the digital twin I/O system 15504 routes the information to the digital twin creation module 15564 to check and/or update the environment digital twin and/or associated digital twins within the environment (e.g., a digital twin of a worker, machine, or robot position at a given time). Further, the digital twin system 15500 may use the embedded output to determine characteristics of the environment 15520.

In embodiments, the digital twin system 15500 embeds output from a LIDAR point cloud system into an industrial digital twin. For example, the digital twin I/O system 15504 may receive information output from one or more Lidar devices 15538 within an industrial environment. The Lidar devices 15538 is configured to provide a plurality of points having associated position data (e.g., coordinates in absolute or relative x, y, and z values). Each of the plurality of points may include further LIDAR attributes, such as intensity, return number, total returns, laser color data, return color data, scan angle, scan direction, etc. The Lidar devices 15538 may provide a point cloud that includes the plurality of points to the digital twin system 15500 via, for example, the digital twin I/O system 15504. Additionally or alternatively, the digital twin system 15500 may receive a stream of points and assemble the stream into a point cloud, or may receive a point cloud and assemble the received point cloud with existing point cloud data, map data, or three dimensional (3D)-model data.

In embodiments, upon receiving the output information, the digital twin I/O system 15504 routes the point cloud information to the digital twin creation module 15564 to check and/or update the environment digital twin and/or associated digital twins within the environment (e.g., a digital twin of a worker, machine, or robot position at a given time). In some embodiments, the digital twin system 15500 is further configured to determine closed-shape objects within the received LIDAR data. For example, the digital twin system 15500 may group a plurality of points within the point cloud as an object and, if necessary, estimate obstructed faces of objects (e.g., a face of the object contacting or adjacent a floor or a face of the object contacting or adjacent another object such as another piece of equipment). The system may use such closed-shape objects to narrow search space for digital twins and thereby increase efficiency of matching algorithms (e.g., a shape-matching algorithm).

In embodiments, the digital twin system 15500 embeds output from a simultaneous location and mapping ("SLAM") system in an environmental digital twin. For example, the digital twin I/O system 15504 may receive information output from the SLAM system, such as Slam sensor 15562, and embed the received information within an environment digital twin corresponding to the location determined by the SLAM system. In embodiments, upon receiving the output information from the SLAM system, the digital twin I/O system 15504 routes the information to the digital twin creation module 15564 to check and/or update the environment digital twin and/or associated digital twins within the environment (e.g., a digital twin of a workpiece, furniture, movable object, or autonomous object). Such updating provides digital twins of non-connected elements (e.g., furnishings or persons) automatically and without need of user interaction with the digital twin system 15500.

In embodiments, the digital twin system 15500 can leverage known digital twins to reduce computational requirements for the Slam sensor 15562 by using suboptimal map-building algorithms. For example, the suboptimal map-building algorithms may allow for a higher uncertainty tolerance using simple bounded-region representations and identifying possible digital twins. Additionally or alternatively, the digital twin system 15500 may use a bounded-region representation to limit the number of digital twins, analyze the group of potential twins for distinguishing features, then perform higher precision analysis for the distinguishing features to identify and/or eliminate categories of, groups of, or individual digital twins and, in the event that no matching digital twin is found, perform a precision scan of only the remaining areas to be scanned.

In embodiments, the digital twin system 15500 may further reduce compute required to build a location map by leveraging data captured from other sensors within the environment (e.g., captured images or video, radio images, etc.) to perform an initial map-building process (e.g., a simple bounded-region map or other suitable photogrammetry methods), associate digital twins of known environmental objects with features of the simple bounded-region map to refine the simple bounded-region map, and perform more precise scans of the remaining simple bounded regions to further refine the map. In some embodiments, the digital twin system 15500 may detect objects within received mapping information and, for each detected object, determine whether the detected object corresponds to an existing digital twin of a real-world-element. In response to determining that the detected object does not correspond to an existing real-world-element digital twin, the digital twin system 15500 may use, for example, the digital twin creation module 15564 to generate a new digital twin corresponding to the detected object (e.g., a detected-object digital twin) and add the detected-object digital twin to the real-world-element digital twins within the digital twin datastore.

Additionally or alternatively, in response to determining that the detected object corresponds to an existing real-world-element digital twin, the digital twin system 15500 may update the real-world-element digital twin to include new information detected by the simultaneous location and mapping sensor, if any.

In embodiments, the digital twin system 15500 represents locations of autonomously or remotely moveable elements and attributes thereof within an industrial digital twin. Such movable elements may include, for example, workers, persons, vehicles, autonomous vehicles, robots, etc. The locations of the moveable elements may be updated in response to a triggering condition. Such triggering conditions may include, for example, expiration of a static or a dynamic predetermined interval, receiving an automatically generated request or instruction from the digital twin system 15500 or components thereof, interaction of an element with a respective sensor or sensors (e.g., in response to a worker or machine breaking a beam or coming within a predetermined distance from a proximity sensor), interaction of a user with a digital twin (e.g., selection of an environmental digital twin, a sensor array digital twin, or a sensor digital twin), combinations thereof, and the like.

In embodiments, the time intervals may be based on probability of the respective movable element having moved within a time period. For example, the time interval for updating a worker location may be relatively shorter for workers expected to move frequently (e.g., a worker tasked with lifting and carrying objects within and through the environment 15520) and relatively longer for workers expected to move infrequently (e.g., a worker tasked with monitoring a process stream). Additionally or alternatively, the time interval may be dynamically adjusted based on applicable conditions, such as increasing the time interval when no movable elements are detected, decreasing the time interval as or when the number of moveable elements within an environment increases (e.g., increasing number of workers and worker interactions), increasing the time interval during periods of reduced environmental activity (e.g., breaks such as lunch), decreasing the time interval during periods of abnormal environmental activity (e.g., tours, inspections, or maintenance), decreasing the time interval when unexpected or uncharacteristic movement is detected (e.g., frequent movement by a typically sedentary element or coordinated movement, for example, of workers approaching an exit or moving cooperatively to carry a large object), combinations thereof, and the like. Further, the time interval may also include additional, semi-random acquisitions. For example, occasional mid-interval locations may be acquired by the digital twin system 15500 to reinforce or evaluate the efficacy of the particular time interval.

In embodiments, the digital twin system 15500 may analyze data received from the digital twin I/O system 15504 to refine, remove, or add conditions. For example, the digital twin system 15500 may optimize data collection times for movable elements that are updated more frequently than needed (e.g., multiple consecutive received positions being identical or within a predetermined margin of error).

In embodiments, the digital twin system 15500 may receive, identify, and/or store a set of states 15840*a-n* related to the environment 15520. The states 15840*a-n* may be, for example, data structures that include a plurality of attributes 158404*a-n* and a set of identifying criteria 158406*a-n* to uniquely identify each respective state 15840*a-n*. In embodiments, the states 15840*a-n* may correspond to states where it is desirable for the digital twin system 15500 to set or alter conditions of real-world elements 157302*r* and/or the environment 15520 (e.g., increase/decrease monitoring intervals, alter operating conditions, etc.).

In embodiments, the set of states 15840*a-n* may further include, for example, minimum monitored attributes for each state 15840*a-n*, the set of identifying criteria 158406*a-n* for each state 15840*a-n*, and/or actions available to be taken or recommended to be taken in response to each state 15840*a-n*. Such information may be stored by, for example, the digital twin datastore 15516 or another datastore. The states 15840*a-n* or portions thereof may be provided to, determined by, or altered by the digital twin system 15500. Further, the set of states 15840*a-n* may include data from disparate sources. For example, details to identify and/or respond to occurrence of a first state may be provided to the digital twin system 15500 via user input, details to identify and/or respond to occurrence of a second state may be provided to the digital twin system 15500 via an external system, details to identify and/or respond to occurrence of a third state may be determined by the digital twin system 15500 (e.g., via simulations or analysis of process data), and details to identify and/or respond to occurrence of a fourth state may be stored by the digital twin system 15500 and altered as desired (e.g., in response to simulated occurrence of the state or analysis of data collected during an occurrence of and response to the state).

In embodiments, the plurality of attributes 158404*a-n* includes at least the attributes 158404*a-n* needed to identify the respective state 15840*a-n*. The plurality of attributes 158404*a-n* may further include additional attributes that are or may be monitored in determining the respective state 15840*a-n*, but are not needed to identify the respective state 15840*a-n*. For example, the plurality of attributes 158404*a-n* for a first state may include relevant information such as rotational speed, fuel level, energy input, linear speed, acceleration, temperature, strain, torque, volume, weight, etc.

The set of identifying criteria 158406*a-n* may include information for each of the set of attributes 158404*a-n* to uniquely identify the respective state. The identifying criteria 158406*a-n* may include, for example, rules, thresholds, limits, ranges, logical values, conditions, comparisons, combinations thereof, and the like.

The change in operating conditions or monitoring may be any suitable change. For example, after identifying occurrence of a respective state 158406*a-n*, the digital twin system 15500 may increase or decrease monitoring intervals for a device (e.g., decreasing monitoring intervals in response to a measured parameter differing from nominal operation) without altering operation of the device. Additionally or alternatively, the digital twin system 15500 may alter operation of the device (e.g., reduce speed or power input) without altering monitoring of the device. In further embodiments, the digital twin system 15500 may alter operation of the device (e.g., reduce speed or power input) and alter monitoring intervals for the device (e.g., decreasing monitoring intervals).

Figure 158:
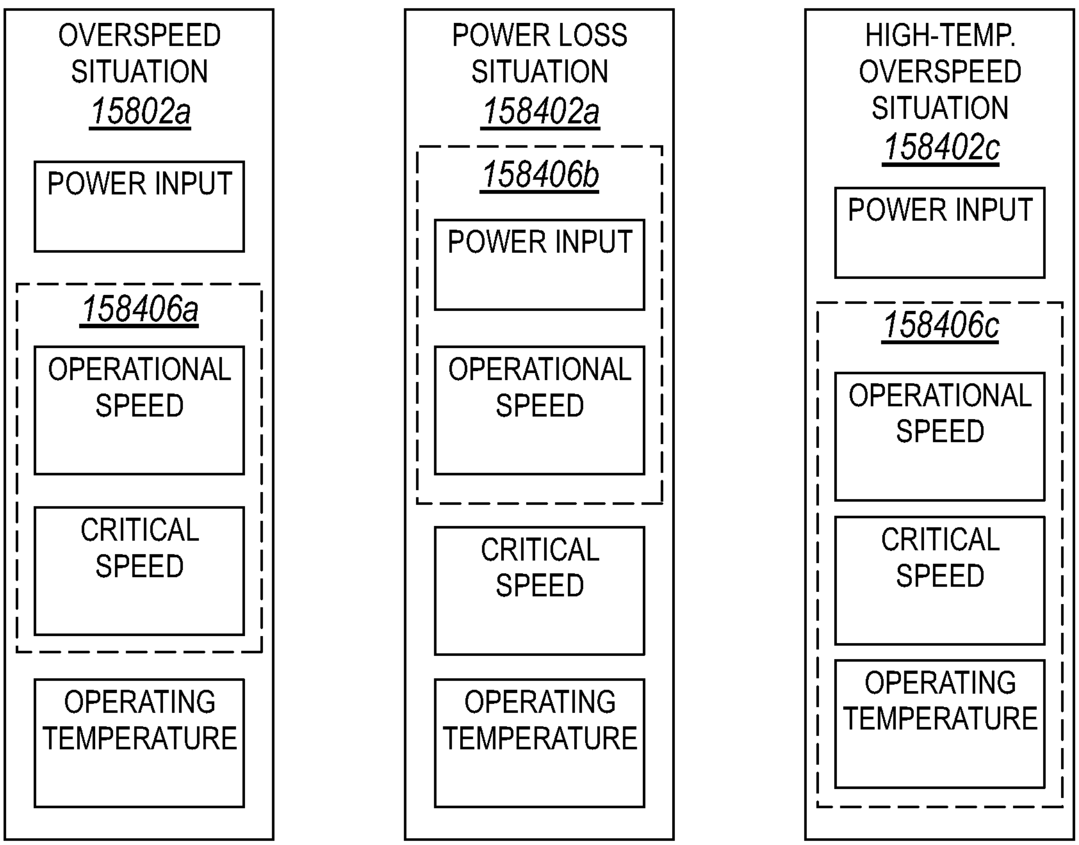

FIG. 158 illustrates an example set of identified states 15840*a-n* related to industrial environments that the digital twin system 15500 may identify and/or store for access by intelligent systems (e.g., the cognitive intelligence system 15510) or users of the digital twin system 15500, according to some embodiments of the present disclosure. The states 15840*a-n* may include operational states (e.g., suboptimal, normal, optimal, critical, or alarm operation of one or more components), excess or shortage states (e.g., supply-side, or output-side quantities), combinations thereof, and the like.

In embodiments, the digital twin system 15500 may monitor attributes 158404*a-n* of real-world elements 157302*r* and/or digital twins 157302*d* to determine the respective state 15840*a-n*. The attributes 158404*a-n* may be, for example, operating conditions, set points, critical points, status indicators, other sensed information, combinations thereof, and the like. For example, the attributes 158404*a-n* may include power input 158404*a*, operational speed 158404*b*, critical speed 158404*c*, and operational temperature 158404*d* of the monitored elements. While the illustrated example illustrates uniform monitored attributes, the monitored attributes may differ by target device (e.g., the digital twin system 15500 would not monitor rotational speed for an object with no rotatable components).

Each of the states 15840*a-n* includes a set of identifying criteria 158406*a-n* meeting particular criteria that are unique among the group of monitored states 13240*a-n*. The digital twin system 15500 may identify the overspeed state 15540*a*, for example, in response to the monitored attributes 158404*a-n* meeting a first set of identifying criteria 158406*a* (e.g., operational speed 158404*b* being higher than the critical speed 158404*c*, while the operational temperature 158404*d* is nominal).

In response to determining that one or more states 15840*a-n* exists or has occurred, the digital twin system 15500 may update triggering conditions for one or more monitoring protocols, issue an alert or notification, or trigger actions of subcomponents of the digital twin system 15500. For example, subcomponents of the digital twin system 15500 may take actions to mitigate and/or evaluate impacts of the detected states 15540*a-n*. When attempting to take actions to mitigate impacts of the detected states 15540*a-n* on real-world elements 157302*r*, the digital twin system 15500 may determine whether instructions exist (e.g., are stored in the digital twin datastore 15516) or should be developed (e.g., developed via simulation and cognitive intelligence or via user or worker input). Further, the digital twin system 15500 may evaluate impacts of the detected states 15540*a-n*, for example, concurrently with the mitigation actions or in response to determining that the digital twin system 15500 has no stored mitigation instructions for the detected states 15540*a-n*.

In embodiments, the digital twin system 15500 employs the digital twin simulation system 15506 to simulate one or more impacts, such as immediate, upstream, downstream, and/or continuing effects, of recognized states. The digital twin simulation system 15506 may collect and/or be provided with values relevant to the evaluated states 15540*a-n*. In simulating the impact of the one or more states 15540*a-n*, the digital twin simulation system 15506 may recursively evaluate performance characteristics of affected digital twins 157302*d* until convergence is achieved. The digital twin simulation system 15506 may work, for example, in tandem with the cognitive intelligence system 15510 to determine response actions to alleviate, mitigate, inhibit, and/or prevent occurrence of the one or more states 15540*a-n*. For example, the digital twin simulation system 15506 may recursively simulate impacts of the one or more states 15540*a-n* until achieving a desired fit (e.g., convergence is achieved), provide the simulated values to the cognitive intelligence system 15510 for evaluation and determination of potential actions, receive the potential actions, evaluate impacts of each of the potential actions for a respective desired fit (e.g., cost functions for minimizing production disturbance, preserving critical components, minimizing maintenance and/or downtime, optimizing system, worker, user, or personal safety, etc.).

In embodiments, the digital twin simulation system 15506 and the cognitive intelligence system 15510 may repeatedly share and update the simulated values and response actions for each desired outcome until desired conditions are met (e.g., convergence for each evaluated cost function for each evaluated action). The digital twin system 15500 may store the results in the digital twin datastore 15516 for use in response to determining that one or more states 15540*a-n* has occurred. Additionally, simulations and evaluations by the digital twin simulation system 15506 and/or the cognitive intelligence system 15510 may occur in response to occurrence or detection of the event.

In embodiments, simulations and evaluations are triggered only when associated actions are not present within the digital twin system 15500. In further embodiments, simulations and evaluations are performed concurrently with use of stored actions to evaluate the efficacy or effectiveness of the actions in real time and/or evaluate whether further actions should be employed or whether unrecognized states may have occurred. In embodiments, the cognitive intelligence system 15510 may also be provided with notifications of instances of undesired actions with or without data on the undesired aspects or results of such actions to optimize later evaluations.

In embodiments, the digital twin system 15500 evaluates and/or represents the impact of machine downtime within a digital twin of a manufacturing facility. For example, the digital twin system 15500 may employ the digital twin simulation system 15506 to simulate the immediate, upstream, downstream, and/or continuing effects of a machine downtime state 15540*b*. The digital twin simulation system 15506 may collect or be provided with performance-related values such as optimal, suboptimal, and minimum performance requirements for elements (e.g., real-world elements 157302*r* and/or nested digital twins 157302*d*) within the affected digital twins 157302*d*, and/or characteristics thereof that are available to the affected digital twins 157302*d*, nested digital twins 157302*d*, redundant systems within the affected digital twins 157302*d*, combinations thereof, and the like.

In embodiments, the digital twin system 15500 is configured to: simulate one or more operating parameters for the real-world elements in response to the industrial environment being supplied with given characteristics using the real-world-element digital twins; calculate a mitigating action to be taken by one or more of the real-world elements in response to being supplied with the contemporaneous characteristics; and actuate, in response to detecting the contemporaneous characteristics, the mitigating action. The calculation may be performed in response to detecting contemporaneous characteristics or operating parameters falling outside of respective design parameters or may be determined via a simulation prior to detection of such characteristics.

Additionally or alternatively, the digital twin system 15500 may provide alerts to one or more users or system elements in response to detecting states.

In embodiments (FIG. 157), the digital twin I/O system 15504 includes a pathing module 157310. The pathing module 157310 may ingest navigational data from the elements 157302, provide and/or request navigational data to components of the digital twin system 15500 (e.g., the digital twin simulation system 15506, the digital twin behavior system, and/or the cognitive intelligence system 15510), and/or output navigational data to elements 157302 (e.g., to the wearable devices 15554). The navigational data may be collected or estimated using, for example, historical data, guidance data provided to the elements 157302, combinations thereof, and the like.

For example, the navigational data may be collected or estimated using historical data stored by the digital twin system 15500. The historical data may include or be processed to provide information such as acquisition time, associated elements 157302, polling intervals, task performed, laden or unladen conditions, whether prior guidance data was provided and/or followed, conditions of the environment 15520, other elements 157302 within the environment 15520, combinations thereof, and the like. The estimated data may be determined using one or more suitable pathing algorithms. For example, the estimated data may be calculated using suitable order-picking algorithms, suitable path-search algorithms, combinations thereof, and the like. The order-picking algorithm may be, for example, a largest gap algorithm, an s-shape algorithm, an aisle-by-aisle algorithm, a combined algorithm, combinations thereof, and the like. The path-search algorithms may be, for example, Dijkstra's algorithm, the A* algorithm, hierarchical path-finding algorithms, incremental path-finding algorithms, any angle path-finding algorithms, flow field algorithms, combinations thereof, and the like.

Additionally or alternatively, the navigational data may be collected or estimated using guidance data of the worker. The guidance data may include, for example, a calculated route provided to a device of the worker (e.g., a mobile device or the wearable device 15554). In another example, the guidance data may include a calculated route provided to a device of the worker that instructs the worker to collect vibration measurements from one or more locations on one or more machines along the route. The collected and/or estimated navigational data may be provided to a user of the digital twin system 15500 for visualization, used by other components of the digital twin system 15500 for analysis, optimization, and/or alteration, provided to one or more elements 157302, combinations thereof, and the like.

In embodiments, the digital twin system 15500 ingests navigational data for a set of workers for representation in a digital twin. Additionally or alternatively, the digital twin system 15500 ingests navigational data for a set of mobile equipment assets of an industrial environment into a digital twin.

In embodiments, the digital twin system 15500 ingests a system for modeling traffic of mobile elements in an industrial digital twin. For example, the digital twin system 15500 may model traffic patterns for workers or persons within the environment 15520, mobile equipment assets, combinations thereof, and the like. The traffic patterns may be estimated based on modeling traffic patterns from and historical data and contemporaneous ingested data. Further, the traffic patterns may be continuously or intermittently updated depending on conditions within the environment 15520 (e.g., a plurality of autonomous mobile equipment assets may provide information to the digital twin system 15500 at a slower update interval than the environment 15520 including both workers and mobile equipment assets).

The digital twin system 15500 may alter traffic patterns (e.g., by providing updated navigational data to one or more of the mobile elements) to achieve one or more predetermined criteria. The predetermined criteria may include, for example, increasing process efficiency, decreasing interactions between laden workers and mobile equipment assets, minimizing worker path length, routing mobile equipment around paths or potential paths of persons, combinations thereof, and the like.

In embodiments, the digital twin system 15500 may provide traffic data and/or navigational information to mobile elements in an industrial digital twin. The navigational information may be provided as instructions or rule sets, displayed path data, or selective actuation of devices. For example, the digital twin system 15500 may provide a set of instructions to a robot to direct the robot to and/or along a desired route for collecting vibration data from one or more specified locations on one or more specified machines along the route using a vibration sensor. The robot may communicate updates to the system including obstructions, reroutes, unexpected interactions with other assets within the environment 15520, etc.

In some embodiments, an ant-based system 15574 enables industrial entities, including robots, to lay a trail with one or more messages for other industrial entities, including themselves, to follow in later journeys. In embodiments, the messages include information related to vibration measurement collection. In embodiments, the messages include information related to vibration sensor measurement locations. In some embodiments, the trails may be configured to fade over time. In some embodiments, the ant-based trails may be experienced via an augmented reality system. In some embodiments, the ant-based trails may be experienced via a virtual reality system. In some embodiments, the ant-based trails may be experienced via a mixed reality system. In some embodiments, ant-based tagging of areas can trigger a pain-response and/or accumulate into a warning signal. In embodiments, the ant-based trails may be configured to generate an information filtering response. In some embodiments, the ant-based trails may be configured to generate an information filtering response wherein the information filtering response is a heightened sense of visual awareness. In some embodiments, the ant-based trails may be configured to generate an information filtering response wherein the information filtering response is a heightened sense of acoustic awareness. In some embodiments, the messages include vectorized data.

In embodiments, the digital twin system 15500 includes design specification information for representing a real-world element **157302*r* using a digital twin 157302*d*. The digital may correspond to an existing real-world element 157302*r* or a potential real-world element 157302*r*. The design specification information may be received from one or more sources. For example, the design specification information may include design parameters set by user input, determined by the digital twin system 15500 (e.g., the via digital twin simulation system 15506), optimized by users or the digital twin simulation system 15506, combinations thereof, and the like. The digital twin simulation system 15506 may represent the design specification information for the component to users, for example, via a display device or a wearable device. The design specification information may be displayed schematically (e.g., as part of a process diagram or table of information) or as part of an augmented reality or virtual reality display. The design specification information may be displayed, for example, in response to a user interaction with the digital twin system 15500 (e.g., via user selection of the element or user selection to generally include design specification information within displays). Additionally or alternatively, the design specification information may be displayed automatically, for example, upon the element coming within view of an augmented reality or virtual reality device. In embodiments, the displayed design specification information may further include indicia of information source (e.g., different displayed colors indicate user input versus digital twin system 15500** determination), indicia of mismatches (e.g., between design specification information and operational information), combinations thereof, and the like.

In embodiments, the digital twin system 15500 embeds a set of control instructions for a wearable device within an industrial digital twin, such that the control instructions are provided to the wearable device to induce an experience for a wearer of the wearable device upon interaction with an element of the industrial digital twin. The induced experience may be, for example, an augmented reality experience or a virtual reality experience. The wearable device, such as a headset, may be configured to output video, audio, and/or haptic feedback to the wearer to induce the experience. For example, the wearable device may include a display device and the experience may include display of information related to the respective digital twin. The information displayed may include maintenance data associated with the digital twin, vibration data associated with the digital twin, vibration measurement location data associated with the digital twin, financial data associated with the digital twin, such as a profit or loss associated with operation of the digital twin, manufacturing KPIs associated with the digital twin, information related to an occluded element (e.g., a sub-assembly) that is at least partially occluded by a foreground element (e.g., a housing), a virtual model of the occluded element overlaid on the occluded element and visible with the foreground element, operating parameters for the occluded element, a comparison to a design parameter corresponding to the operating parameter displayed, combinations thereof, and the like. Comparisons may include, for example, altering display of the operating parameter to change a color, size, and/or display period for the operating parameter.

In some embodiments, the displayed information may include indicia for removable elements that are or may be configured to provide access to the occluded element with each indicium being displayed proximate to or overlying the respective removable element. Further, the indicia may be sequentially displayed such that a first indicium corresponding to a first removable element (e.g., a housing) is displayed, and a second indicium corresponding to a second removable element (e.g., an access panel within the housing) is displayed in response to the worker removing the first removable element. In some embodiments, the induced experience allows the wearer to see one or more locations on a machine for optimal vibration measurement collection. In an example, the digital twin system 15500 may provide an augmented reality view that includes highlighted vibration measurement collection locations on a machine and/or instructions related to collecting vibration measurements. Furthering the example, the digital twin system 15500 may provide an augmented reality view that includes instructions related to timing of vibration measurement collection. Information utilized in displaying the highlighted placement locations may be obtained using information stored by the digital twin system 15500. In some embodiments, mobile elements may be tracked by the digital twin system 15500 (e.g., via observational elements within the environment 15520 and/or via pathing information communicated to the digital twin system 15500) and continually displayed by the wearable device within the occluded view of the worker. This optimizes movement of elements within the environment 15520, increases worker safety, and minimizes down time of elements resulting from damage.

In some embodiments, the digital twin system 15500 may provide an augmented reality view that displays mismatches between design parameters or expected parameters of real-world elements **157302*r* to the wearer. The displayed information may correspond to real-world elements 157302*r* that are not within the view of the wearer (e.g., elements within another room or obscured by machinery). This allows the worker to quickly and accurately troubleshoot mismatches to determine one or more sources for the mismatch. The cause of the mismatch may then be determined, for example, by the digital twin system 15500** and corrective actions ordered. In example embodiments, a wearer may be able to view malfunctioning subcomponents of machines without removing occluding elements (e.g., housings or shields). Additionally or alternatively, the wearer may be provided with instructions to repair the device, for example, including display of the removal process (e.g., location of fasteners to be removed), assemblies or subassemblies that should be transported to other areas for repair (e.g., dust-sensitive components), assemblies or subassemblies that need lubrication, and locations of objects for reassembly (e.g., storing location that the wearer has placed removed objects and directing the wearer or another wearer to the stored locations to expedite reassembly and minimize further disassembly or missing parts in the reassembled element). This can expedite repair work, minimize process impact, allow workers to disassemble and reassemble equipment (e.g., by coordinating disassembly without direct communication between the workers), increase equipment longevity and reliability (e.g., by assuring that all components are properly replaced prior to placing back in service), combinations thereof, and the like.

In some embodiments, the induced experience includes a virtual reality view or an augmented reality view that allows the wearer to see information related to existing or planned elements. The information may be unrelated to physical performance of the element (e.g., financial performance such as asset value, energy cost, input material cost, output material value, legal compliance, and corporate operations). One or more wearers may perform a virtual walkthrough or an augmented walkthrough of the industrial environment 15520.

In examples, the wearable device displays compliance information that expedites inspections or performance of work.

In further examples, the wearable device displays financial information that is used to identify targets for alteration or optimization. For example, a manager or officer may inspect the environment 15520 for compliance with updated regulations, including information regarding compliance with former regulations, "grandfathered," and/or excepted elements. This can be used to reduce unnecessary downtime (e.g., scheduling upgrades for the least impactful times, such as during planned maintenance cycles), prevent unnecessary upgrades (e.g., replacing grandfathered or excepted equipment), and reduce capital investment.

Referring back to FIG. 155, in embodiments, the digital twin system 15500 may include, integrate, integrate with, manage, handle, link to, take input from, provide output to, control, coordinate with, or otherwise interact with a digital twin dynamic model system 15508. The digital twin dynamic model system 15508 can update the properties of a set of digital twins of a set of industrial entities and/or environments, including properties of physical industrial assets, workers, processes, manufacturing facilities, warehouses, and the like (or any of the other types of entities or environments described in this disclosure or in the documents incorporated by reference herein) in such a manner that the digital twins may represent those industrial entities and environments, and properties or attributes thereof, in real-time or very near real-time. In some embodiments, the digital twin dynamic model system 15508 may obtain sensor data received from a sensor system 15530 and may determine one or more properties of an industrial environment or an industrial entity within an environment based on the sensor data and based on one or more dynamic models.

In embodiments, the digital twin dynamic model system 15508 may update/assign values of various properties in a digital twin and/or one or more embedded digital twins, including, but not limited to, vibration values, vibration fault level states, probability of failure values, probability of downtime values, cost of downtime values, probability of shutdown values, financial values, KPI values, temperature values, humidity values, heat flow values, fluid flow values, radiation values, substance concentration values, velocity values, acceleration values, location values, pressure values, stress values, strain values, light intensity values, sound level values, volume values, shape characteristics, material characteristics, and dimensions.

In embodiments, a digital twin may be comprised of (e.g., via reference) of other embedded digital twins. For example, a digital twin of a manufacturing facility may include an embedded digital twin of a machine and one or more embedded digital twins of one or more respective motors enclosed within the machine. A digital twin may be embedded, for example, in the memory of an industrial machine that has an onboard IT system (e.g., the memory of an Onboard Diagnostic System, control system (e.g., SCADA system) or the like). Other non-limiting examples of where a digital twin may be embedded include the following: on a wearable device of a worker; in memory on a local network asset, such as a switch, router, access point, or the like; in a cloud computing resource that is provisioned for an environment or entity; and on an asset tag or other memory structure that is dedicated to an entity.

In one example, the digital twin dynamic model system 15508 can update vibration characteristics throughout an industrial environment digital twin based on captured vibration sensor data measured at one or more locations in the industrial environment and one or more dynamic models that model vibration within the industrial environment digital twin. The industrial digital twin may, before updating, already contain information about properties of the industrial entities and/or environment that can be used to feed a dynamic model, such as information about materials, shapes/volumes (e.g., of conduits), positions, connections/interfaces, and the like, such that vibration characteristics can be represented for the entities and/or environment in the digital twin. Alternatively, the dynamic models may be configured using such information.

In embodiments, the digital twin dynamic model system 15508 can update the properties of a digital twin and/or one or more embedded digital twins on behalf of a client application 15570. In embodiments, a client application 15570 may be an application relating to an industrial component or environment (e.g., monitoring an industrial facility or a component within, simulating an industrial environment, or the like). In embodiments, the client application 15570 may be used in connection with both fixed and mobile data collection systems. In embodiments, the client application 15570 may be used in connection with Industrial Internet of Things sensor system 15530.

In embodiments, the digital twin dynamic model system 15508 leverages digital twin dynamic models 155100 to model the behavior of an industrial entity and/or environment. Dynamic models 155100 may enable digital twins to represent physical reality, including the interactions of industrial entities, by using a limited number of measurements to enrich the digital representation of an industrial entity and/or environment, such as based on scientific principles. In embodiments, the dynamic models 155100 are formulaic or mathematical models. In embodiments, the dynamic models 155100 adhere to scientific laws, laws of nature, and formulas (e.g., Newton's laws of motion, second law of thermodynamics, Bernoulli's principle, ideal gas law, Dalton's law of partial pressures, Hooke's law of elasticity, Fourier's law of heat conduction, Archimedes' principle of buoyancy, and the like). In embodiments, the dynamic models are machine-learned models.

In embodiments, the digital twin system 15500 may have a digital twin dynamic model datastore 155102 for storing dynamic models 155100 that may be represented in digital twins. In embodiments, digital twin dynamic model datastore can be searchable and/or discoverable. In embodiments, digital twin dynamic model datastore can contain metadata that allows a user to understand what characteristics a given dynamic model can handle, what inputs are required, what outputs are provided, and the like. In some embodiments, digital twin dynamic model datastore 155102 can be hierarchical (such as where a model can be deepened or made more simple based on the extent of available data and/or inputs, the granularity of the inputs, and/or situational factors (such as where something becomes of high interest and a higher fidelity model is accessed for a period of time).

In embodiments, a digital twin or digital representation of an industrial entity or facility may include a set of data structures that collectively define a set of properties of a represented physical industrial asset, device, worker, process, facility, and/or environment, and/or possible behaviors thereof. In embodiments, the digital twin dynamic model system 15508 may leverage the dynamic models 155100 to inform the set of data structures that collectively define a digital twin with real-time data values. The digital twin dynamic models 155100 may receive one or more sensor measurements, Industrial Internet of Things device data, and/or other suitable data as inputs and calculate one or more outputs based on the received data and one or more dynamic models 155100. The digital twin dynamic model system 15508 then uses the one or more outputs to update the digital twin data structures.

In one example, the set of properties of a digital twin of an industrial asset that may be updated by the digital twin dynamic model system 15508 using dynamic models 155100 may include the vibration characteristics of the asset, temperature(s) of the asset, the state of the asset (e.g., a solid, liquid, or gas), the location of the asset, the displacement of the asset, the velocity of the asset, the acceleration of the asset, probability of downtime values associated with the asset, cost of downtime values associated with the asset, probability of shutdown values associated with the asset, manufacturing KPIs associated with the asset, financial information associated with the asset, heat flow characteristics associated with the asset, fluid flow rates associated with the asset (e.g., fluid flow rates of a fluid flowing through a pipe), identifiers of other digital twins embedded within the digital twin of the asset and/or identifiers of digital twins embedding the digital twin of the asset, and/or other suitable properties. Dynamic models 155100 associated with a digital twin of an asset can be configured to calculate, interpolate, extrapolate, and/or output values for such asset digital twin properties based on input data collected from sensors and/or devices disposed in the industrial setting and/or other suitable data and subsequently populate the asset digital twin with the calculated values.

In some embodiments, the set of properties of a digital twin of an industrial device that may be updated by the digital twin dynamic model system 15508 using dynamic models 155100 may include the status of the device, a location of the device, the temperature(s) of a device, a trajectory of the device, identifiers of other digital twins that the digital twin of the device is embedded within, embeds, is linked to, includes, integrates with, takes input from, provides output to, and/or interacts with and the like. Dynamic models 155100 associated with a digital twin of a device can be configured to calculate or output values for these device digital twin properties based on input data and subsequently update the device digital twin with the calculated values.

In some embodiments, the set of properties of a digital twin of an industrial worker that may be updated by the digital twin dynamic model system 15508 using dynamic models 155100 may include the status of the worker, the location of the worker, a stress measure for the worker, a task being performed by the worker, a performance measure for the worker, and the like. Dynamic models associated with a digital twin of an industrial worker can be configured to calculate or output values for such properties based on input data, which then may be used to populate industrial worker digital twin. In embodiments, industrial worker dynamic models (e.g., psychometric models) can be configured to predict reactions to stimuli, such as cues that are given to workers to direct them to undertake tasks and/or alerts or warnings that are intended to induce safe behavior. In embodiments, industrial worker dynamic models may be workflow models (Gantt charts and the like), failure mode effects analysis models (FMEA), biophysical models (such as to model worker fatigue, energy utilization, hunger), and the like.

Example properties of a digital twin of an industrial environment that may be updated by the digital twin dynamic model system 15508 using dynamic models 155100 may include the dimensions of the industrial environment, the temperature(s) of the industrial environment, the humidity value(s) of the industrial environment, the fluid flow characteristics in the industrial environment, the heat flow characteristics of the industrial environment, the lighting characteristics of the industrial environment, the acoustic characteristics of the industrial environment the physical objects in the environment, processes occurring in the industrial environment, currents of the industrial environment (if a body of water), and the like. Dynamic models associated with a digital twin of an industrial environment can be configured to calculate or output these properties based on input data collected from sensors and/or devices disposed in the industrial environment and/or other suitable data and subsequently populate the industrial environment digital twin with the calculated values.

In embodiments, dynamic models 155100 may adhere to physical limitations that define boundary conditions, constants, or variables for digital twin modeling. For example, the physical characterization of a digital twin of an industrial entity or industrial environment may include a gravity constant (e.g., 9.8 m/s2), friction coefficients of surfaces, thermal coefficients of materials, maximum temperatures of assets, maximum flow capacities, and the like. Additionally or alternatively, the dynamic models may adhere to the laws of nature. For example, dynamic models may adhere to the laws of thermodynamics, laws of motion, laws of fluid dynamics, laws of buoyancy, laws of heat transfer, laws or radiation, laws of quantum dynamics, and the like. In some embodiments, dynamic models may adhere to biological aging theories or mechanical aging principles. Thus, when the digital twin dynamic model system 15508 facilitates a real-time digital representation, the digital representation may conform to dynamic models, such that the digital representations mimic real world conditions. In some embodiments, the output(s) from a dynamic model can be presented to a human user and/or compared against real-world data to ensure convergence of the dynamic models with the real world. Furthermore, as dynamic models are based partly on assumptions, the properties of a digital twin may be improved and/or corrected when a real-world behavior differs from that of the digital twin. In embodiments, additional data collection and/or instrumentation can be recommended based on the recognition that an input is missing from a desired dynamic model, that a model in operation is not working as expected (perhaps due to missing and/or faulty sensor information), that a different result is needed (such as due to situational factors that make something of high interest), and the like.

Dynamic models may be obtained from a number of different sources. In some embodiments, a user can upload a model created by the user or a third party. Additionally or alternatively, the models may be created on the digital twin system using a graphical user interface. The dynamic models may include bespoke models that are configured for a particular environment and/or set of industrial entities and/or agnostic models that are applicable to similar types of digital twins. The dynamic models may be machine-learned models.

FIG. 159 illustrates example embodiments of a method for updating a set of properties of a digital twin and/or one or more embedded digital twins on behalf of client applications 15570. In embodiments, digital twin dynamic model system 15508 leverages one or more dynamic models 155100 to update a set of properties of a digital twin and/or one or more embedded digital twins on behalf of client application 15570 based on the impact of collected sensor data from sensor system 15530, data collected from Internet of Things connected devices 15524, and/or other suitable data in the set of dynamic models 155100 that are used to enable the industrial digital twins. In embodiments, the digital twin dynamic model system 15508 may be instructed to run specific dynamic models using one or more digital twins that represent physical industrial assets, devices, workers, processes, and/or industrial environments that are managed, maintained, and/or monitored by the client applications 15570.

In embodiments, the digital twin dynamic model system 15508 may obtain data from other types of external data sources that are not necessarily industrial-related data sources, but may provide data that can be used as input data for the dynamic models. For example, weather data, news events, social media data, and the like may be collected, crawled, subscribed to, and the like to supplement sensor data, Industrial Internet of Things device data, and/or other data that is used by the dynamic models. In embodiments, the digital twin dynamic model system 15508 may obtain data from a machine vision system. The machine vision system may use video and/or still images to provide measurements (e.g., locations, statuses, and the like) that may be used as inputs by the dynamic models.

In embodiments, the digital twin dynamic model system 15508 may feed this data into one or more of the dynamic models discussed above to obtain one or more outputs. These outputs may include calculated vibration fault level states, vibration severity unit values, vibration characteristics, probability of failure values, probability of downtime values, probability of shutdown values, cost of downtime values, cost of shutdown values, time to failure values, temperature values, pressure values, humidity values, precipitation values, visibility values, air quality values, strain values, stress values, displacement values, velocity values, acceleration values, location values, performance values, financial values, manufacturing KPI values, electrodynamic values, thermodynamic values, fluid flow rate values, and the like. The client application 15570 may then initiate a digital twin visualization event using the results obtained by the digital twin dynamic model system 15508. In embodiments, the visualization may be a heat map visualization.

In embodiments, the digital twin dynamic model system 15508 may receive requests to update one or more properties of digital twins of industrial entities and/or environments such that the digital twins represent the industrial entities and/or environments in real-time. At 159100, the digital twin dynamic model system 15508 receives a request to update one or more properties of one or more of the digital twins of industrial entities and/or environments. For example, the digital twin dynamic model system 15508 may receive the request from a client application 15570 or from another process executed by the digital twin system 15500 (e.g., a predictive maintenance process). The request may indicate the one or more properties and the digital twin or digital twins implicated by the request. Referring to FIG. 159, in step 159102, the digital twin dynamic model system 15508 determines the one or more digital twins required to fulfill the request and retrieves the one or more required digital twins, including any embedded digital twins, from digital twin datastore 15516. At 159104, digital twin dynamic model system 15508 determines one or more dynamic models required to fulfill the request and retrieves the one or more required dynamic models from digital twin dynamic model datastore 155102. At 159106, the digital twin dynamic model system 15508 selects one or more sensors from sensor system 15530, data collected from Internet of Things connected devices 15524, and/or other data sources from digital twin I/O system 15504 based on available data sources and the one or more required inputs of the dynamic model(s). In embodiments, the data sources may be defined in the inputs required by the one or more dynamic models or may be selected using a lookup table. At 159108, the digital twin dynamic model system 15508 retrieves the selected data from digital twin I/O system 15504. At 159110, digital twin dynamic model system 15508 runs the dynamic model(s) using the retrieved input data (e.g., vibration sensor data, Industrial Internet of Things device data, and the like) as inputs and determines one or more output values based on the dynamic model(s) and the input data. At 159112, the digital twin dynamic model system 15508 updates the values of one or more properties of the one or more digital twins based on the one or more outputs of the dynamic model(s).

In example embodiments, client application 15570 may be configured to provide a digital representation and/or visualization of the digital twin of an industrial entity. In embodiments, the client application 15570 may include one or more software modules that are executed by one or more server devices. These software modules may be configured to quantify properties of the digital twin, model properties of a digital twin, and/or to visualize digital twin behaviors. In embodiments, these software modules may enable a user to select a particular digital twin behavior visualization for viewing. In embodiments, these software modules may enable a user to select to view a digital twin behavior visualization playback. In some embodiments, the client application 15570 may provide a selected behavior visualization to digital twin dynamic model system 15508.

In embodiments, the digital twin dynamic model system 15508 may receive requests from client application 15570 to update properties of a digital twin in order to enable a digital representation of an industrial entity and/or environment wherein the real-time digital representation is a visualization of the digital twin. In embodiments, a digital twin may be rendered by a computing device, such that a human user can view the digital representations of real-world industrial assets, devices, workers, processes and/or environments. For example, the digital twin may be rendered and outcome to a display device. In embodiments, dynamic model outputs and/or related data may be overlaid on the rendering of the digital twin. In embodiments, dynamic model outputs and/or related information may appear with the rendering of the digital twin in a display interface. In embodiments, the related information may include real-time video footage associated with the real-world entity represented by the digital twin. In embodiments, the related information may include a sum of each of the vibration fault level states in the machine. In embodiments, the related information may be graphical information. In embodiments, the graphical information may depict motion and/or motion as a function of frequency for individual machine components. In embodiments, graphical information may depict motion and/or motion as a function of frequency for individual machine components, wherein a user is enabled to select a view of the graphical information in the x, y, and z dimensions. In embodiments, graphical information may depict motion and/or motion as a function of frequency for individual machine components, wherein the graphical information includes harmonic peaks and peaks. In embodiments, the related information may be cost data, including the cost of downtime per day data, cost of repair data, cost of new part data, cost of new machine data, and the like. In embodiments, related information may be a probability of downtime data, probability of failure data, and the like. In embodiments, related information may be time to failure data.

In embodiments, the related information may be recommendations and/or insights. For example, recommendations or insights received from the cognitive intelligence system related to a machine may appear with the rendering of the digital twin of a machine in a display interface.

In embodiments, clicking, touching, or otherwise interacting with the digital twin rendered in the display interface can allow a user to "drill down" and see underlying subsystems or processes and/or embedded digital twins. For example, in response to a user clicking on a machine bearing rendered in the digital twin of a machine, the display interface can allow a user to drill down and see information related to the bearing, view a 3D visualization of the bearing's vibration, and/or view a digital twin of the bearing.

In embodiments, clicking, touching, or otherwise interacting with information related to the digital twin rendered in the display interface can allow a user to "drill down" and see underlying information.

FIG. 160 illustrates example embodiments of a display interface that renders the digital twin of a dryer centrifuge and other information related to the dryer centrifuge.

In some embodiments, the digital twin may be rendered and output in a virtual reality display. For example, a user may view a 3D rendering of an environment (e.g., using a monitor or a virtual reality headset). The user may also inspect and/or interact with digital twins of industrial entities. In embodiments, a user may view processes being performed with respect to one or more digital twins (e.g., collecting measurements, movements, interactions, inventorying, loading, packing, shipping, and the like). In embodiments, a user may provide input that controls one or more properties of a digital twin via a graphical user interface.

In some embodiments, the digital twin dynamic model system 15508 may receive requests from client application 15570 to update properties of a digital twin in order to enable a digital representation of industrial entities and/or environments wherein the digital representation is a heat map visualization of the digital twin. In embodiments, a platform is provided having heat maps displaying collected data from the sensor system 15530, Internet of Things connected devices 15524, and data outputs from dynamic models 155100 for providing input to a display interface. In embodiments, the heat map interface is provided as an output for digital twin data, such as for handling and providing information for visualization of various sensor data, dynamic model output data, and other data (such as map data, analog sensor data, and other data), such as to another system, such as a mobile device, tablet, dashboard, computer, AR/VR device, or the like. A digital twin representation may be provided in a form factor (e.g., user device, VR-enabled device, AR-enabled device, or the like) suitable for delivering visual input to a user, such as the presentation of a map that includes indicators of levels of analog sensor data, digital sensor data, and output values from the dynamic models (such as data indicating vibration fault level states, vibration severity unit values, probability of downtime values, cost of downtime values, probability of shutdown values, time to failure values, probability of failure values, manufacturing KPIs, temperatures, levels of rotation, vibration characteristics, fluid flow, heating or cooling, pressure, substance concentrations, and many other output values). In embodiments, signals from various sensors or input sources (or selective combinations, permutations, mixes, and the like) as well as data determined by the digital twin dynamic model system 15508 may provide input data to a heat map. Coordinates may include real world location coordinates (such as geo-location or location on a map of an environment), as well as other coordinates, such as time-based coordinates, frequency-based coordinates, or other coordinates that allow for representation of analog sensor signals, digital signals, dynamic model outputs, input source information, and various combinations, in a map-based visualization, such that colors may represent varying levels of input along the relevant dimensions. For example, among many other possibilities, if an industrial machine component is at a critical vibration fault level state, the heat map interface may alert a user by showing the machine component in orange. In the example of a heat map, clicking, touching, or otherwise interacting with the heat map can allow a user to drill down and see underlying sensor, dynamic model outputs, or other input data that is used as an input to the heat map display. In other examples, such as ones where a digital twin is displayed in a VR or AR environment, if an industrial machine component is vibrating outside of normal operation (e.g., at a suboptimal, critical, or alarm vibration fault level), a haptic interface may induce vibration when a user touches a representation of the machine component, or if a machine component is operating in an unsafe manner, a directional sound signal may direct a user's attention toward the machine in digital twin, such as by playing in a particular speaker of a headset or other sound system.

In embodiments, the digital twin dynamic model system 15508 may take a set of ambient environmental data and/or other data and automatically update a set of properties of a digital twin of an industrial entity or facility based on the impact of the environmental data and/or other data in the set of dynamic models 155100 that are used to enable the digital twin. Ambient environmental data may include temperature data, pressure data, humidity data, wind data, rainfall data, tide data, storm surge data, cloud cover data, snowfall data, visibility data, water level data, and the like. Additionally or alternatively, the digital twin dynamic model system 15508 may use a set of environmental data measurements collected by a set of Internet of Things connected devices 15524 disposed in an industrial setting as inputs for the set of dynamic models 155100 that are used to enable the digital twin. For example, digital twin dynamic model system 15508 may feed the dynamic models 155100 data collected, handled or exchanged by Internet of Things connected devices 15524, such as cameras, monitors, embedded sensors, mobile devices, diagnostic devices and systems, instrumentation systems, telematics systems, and the like, such as for monitoring various parameters and features of machines, devices, components, parts, operations, functions, conditions, states, events, workflows and other elements (collectively encompassed by the term "states") of industrial environments. Other examples of Internet of Things connected devices include smart fire alarms, smart security systems, smart air quality monitors, smart/learning thermostats, and smart lighting systems.

FIG. 161 illustrates example embodiments of a method for updating a set of vibration fault level states for a set of bearings in a digital twin of a machine. In this example, a client application 15570, which interfaces with digital twin dynamic model system 15508, may be configured to provide a visualization of the fault level states of the bearings in the digital twin of the machine.

In this example, the digital twin dynamic model system 15508 may receive requests from client application 15570 to update the vibration fault level states of the machine digital twin. At 161200, digital twin dynamic model system 15508 receives a request from client application 15570 to update one or more vibration fault level states of the machine digital twin. Next, in step 161202, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins, such as any embedded motor digital twins and bearing digital twins, and any digital twins that embed the machine digital twin, such as the manufacturing facility digital twin. At 161204, digital twin dynamic model system 15508 determines one or more dynamic models required to fulfill the request and retrieves the one or more required dynamic models from the digital twin dynamic model datastore 155102. At 161206, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the and the one or more required inputs of the dynamic model(s). In the present example, the retrieved dynamic model(s) 155100 may take one or more vibration sensor measurements from vibration sensors 15536 as inputs to the dynamic models. In embodiments, vibration sensors 15536 may be optical vibration sensors, single axis vibration sensors, tri-axial vibration sensors, and the like. At 161208, digital twin dynamic model system 15508 retrieves one or more measurements from each of the selected data sources from the digital twin I/O system 15504. Next, At 161210, digital twin dynamic model system 15508 runs the dynamic model(s), using the retrieved vibration sensor measurements as inputs, and calculates one or more outputs that represent bearing vibration fault level states. Next, At 161212, the digital twin dynamic model system 15508 updates one or more bearing fault level states of the manufacturing facility digital twin, machine digital twin, motor digital twin, and/or bearing digital twins based on the one or more outputs of the dynamic model(s). The client application 15570 may obtain vibration fault level states of the bearings and may display the obtained vibration fault level state associated with each bearing and/or display colors associated with fault level severity (e.g., red for alarm, orange for critical, yellow for suboptimal, green for normal operation) in the rendering of one or more of the digital twins on a display interface.

In another example, a client application 15570 may be an augmented reality application. In some embodiments of this example, the client application 15570 may obtain vibration fault level states of bearings in a field of view of an AR-enabled device (e.g., smart glasses) hosting the client application from the digital twin of the industrial environment (e.g., via an API of the digital twin system 15500) and may display the obtained vibration fault level states on the display of the AR-enabled device, such that the vibration fault level state displayed corresponds to the location in the field of view of the AR-enabled device. In this way, a vibration fault level state may be displayed even if there are no vibration sensors located within the field of view of the AR-enabled device.

FIG. 162 illustrates example embodiments of a method for updating a set of vibration severity unit values of bearings in a digital twin of a machine. Vibration severity units may be measured as displacement, velocity, and acceleration.

In this example, client application 15570 that interfaces with the digital twin dynamic model system 15508 may be configured to provide a visualization of the three-dimensional vibration characteristics of bearings in a digital twin of a machine.

In this example, the digital twin dynamic model system 15508 may receive requests from client application 15570 to update the vibration severity unit values for bearings in the digital twin of a machine. At 162300, digital twin dynamic model system 15508 receives a request from client application 15570 to update one or more vibration severity unit value(s) of the manufacturing facility digital twin. Next, in step 162302, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins (e.g., digital twins of bearings and other components). At 162304, digital twin dynamic model system 15508 determines one or more dynamic models required to fulfill the request and retrieves the one or more required dynamic models from dynamic model datastore 155102. At 162306, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the one or more required inputs of the dynamic model(s). In the present example, the retrieved dynamic models may be configured to take one or more vibration sensor measurements as inputs and provide severity unit values for bearings in the machine. At 162308, digital twin dynamic model system 15508 retrieves one or more measurements from each of the selected sensors. In the present example, the digital twin dynamic model system 15508 retrieves measurements from vibration sensors 15536 via digital twin I/O system 15504. At 162310, digital twin dynamic model system 15508 runs the dynamic model(s) using the retrieved vibration measurements as inputs and calculates one or more output values that represent vibration severity unit values for bearings in the machine. Next, at 162312, the digital twin dynamic model system 15508 updates one or more vibration severity unit values of the bearings in the machine digital twin and all other embedded digital twins or digital twins that embed the machine digital twin based on the one or more values output by the dynamic model(s).

FIG. 163 illustrates example embodiments of a method for updating a set of probability of failure values for machine components in the digital twin of a machine.

In this example, the digital twin dynamic model system 15508 may receive requests from client application 15570 to update the probability of failure values for components in a machine digital twin. At 156400, digital twin dynamic model system 15508 receives a request from client application 15570 to update one or more probability of failure value(s) of the machine digital twin, any embedded component digital twins, and any digital twins that embed the machine digital twin such as a manufacturing facility digital twin. Next, in step 163402, digital twin dynamic model system 15508 determines the one or more digital twins required to fulfill the request and retrieves the one or more required digital twins. In this example, the digital twin dynamic model system 15508 may retrieve the digital twin of the manufacturing facility, the digital twin of the machine, and the digital twins of machine components from digital twin datastore 15516. At 163404, digital twin dynamic model system 15508 determines one or more dynamic models required to fulfill the request and retrieves the one or more required dynamic models from dynamic model datastore 155102. At 163406, the digital twin dynamic model system 15508 selects, via digital twin I/O system 15504, dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s). In the present example, the retrieved dynamic models may take one or more vibration measurements from vibration sensors 15536 and historical failure data as dynamic model inputs and output probability of failure values for the machine components in the digital twin of the machine. At 163408, digital twin dynamic model system 15508 retrieves data from each of the selected sensors and/or Internet of Things connected devices via digital twin I/O system 15504. At 163410, digital twin dynamic model system 15508 runs the dynamic model(s) using the retrieved vibration data and historical failure data as inputs and calculates one or more outputs that represent probability of failure values for bearings in the machine digital twin. Next, At 163412, the digital twin dynamic model system 15508 updates one or more probability of failure values of the bearings in the machine digital twin, all embedded digital twins, and all digital twins that embed the machine digital twin based on the output of the dynamic model(s).

FIG. 164 illustrates example embodiments of a method for updating a set of probability of downtime for machines in the digital twin of a manufacturing facility.

In this example, client application 15570, which interfaces with the digital twin dynamic model system 15508, may be configured to provide a visualization of the probability of downtime values of a manufacturing facility in the digital twin of the manufacturing facility.

In this example, the digital twin dynamic model system 15508 may receive requests from client application 15570 to assign probability of downtime values to machines in a manufacturing facility digital twin. At 164500, digital twin dynamic model system 16208 receives a request from client application 15570 to update one or more probability of downtime values of machines in the manufacturing facility digital twin and any embedded digital twins such as the individual machine digital twins. Next, in step 164502, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the manufacturing facility and any embedded digital twins from digital twin datastore 15516. At 164504, digital twin dynamic model system 15508 determines one or more dynamic models required to fulfill the request and retrieves the one or more required dynamic models from dynamic model datastore 155102. At 164506, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the dynamic model(s) may be configured to take vibration measurements from vibration sensors and historical downtime data as inputs and output probability of downtime values for different machines throughout the manufacturing facility. At 164508, digital twin dynamic model system 15508 retrieves one or more measurements from each of the selected sensors via digital twin I/O system 15504. At 164510, digital twin dynamic model system 15508 runs the dynamic model(s) using the retrieved vibration measurements and historical downtime data as inputs and calculates one or more outputs that represent probability of downtime values for machines in the manufacturing facility. Next, At 164512, the digital twin dynamic model system 15508 updates one or more probability of downtime values for machines in the manufacturing facility digital twins and all embedded digital twins based on the one or more outputs of the dynamic models.

FIG. 165 illustrates example embodiments of a method for updating one or more probability of shutdown values in the digital twin of an enterprise having a set of manufacturing facilities.

In the present example, the digital twin dynamic model system 15508 may receive requests from client application 15570 to update the probability of shutdown values for the set of manufacturing facilities within an enterprise digital twin. At 165600, digital twin dynamic model system 15508 receives a request from client application 15570 to update one or more probability of shutdown values of the enterprise digital twin and any embedded digital twins. Next, in step 165602, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the enterprise and any embedded digital twins. At 165604, digital twin dynamic model system 15508 determines one or more dynamic models required to fulfill the request and retrieves the one or more required dynamic models from dynamic model datastore 155102. At 165606, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic models may be configured to take one or more vibration measurements from vibration sensors 15536 and/or other suitable data as inputs and output probability of shutdown values for each manufacturing entity in the enterprise digital twin. At 165608, digital twin dynamic model system 15508 retrieves one or more vibration measurements from each of the selected vibration sensors 15536 from digital twin I/O system 15504. At 165610, digital twin dynamic model system 15508 runs the dynamic model(s) using the retrieved vibration measurements and historical shut down data as inputs and calculates one or more outputs that represent probability of shutdown values for manufacturing facilities within the enterprise digital twin. Next, at 165612, the digital twin dynamic model system 15508 updates one or more probability of shutdown values of the enterprise digital twin and all embedded digital twins based on the one or more outputs of the dynamic model(s).

FIG. 166 illustrates example embodiments of a method for updating a set of cost of downtime values in machines in the digital twin of a manufacturing facility. In the present example, the digital twin dynamic model system 15508 may receive requests from a client application 15570 to populate real-time cost of downtime values associated with machines in a manufacturing facility digital twin. At 166700, digital twin dynamic model system 15508 receives a request from the client application 15570 to update one or more cost of downtime values of the manufacturing facility digital twin and any embedded digital twins (e.g., machines, machine parts, and the like) from the client application 15570. Next, in step 166702, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 166704, digital twin dynamic model system 15508 determines one or more dynamic models required to fulfill the request and retrieves the one or more required dynamic models from dynamic model datastore 155102. At 166706, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take historical downtime data and operational data as inputs and output data representing cost of downtime per day for machines in the manufacturing facility. At 166708, digital twin dynamic model system 15508 retrieves historical downtime data and operational data from digital twin I/O system 15504. At 166710, digital twin dynamic model system 15508 runs the dynamic model(s) using the retrieved data as input and calculates one or more outputs that represent cost of downtime per day for machines in the manufacturing facility. Next, at 166712, the digital twin dynamic model system 15508 updates one or more cost of downtime values of the manufacturing facility digital twins and machine digital twins based on the one or more outputs of the dynamic model(s).

FIG. 167 illustrates example embodiments of a method for updating a set of manufacturing KPI values in the digital twin of a manufacturing facility. In embodiments, the manufacturing KPI is selected from the set of uptime, capacity utilization, on standard operating efficiency, overall operating efficiency, overall equipment effectiveness, machine downtime, unscheduled downtime, machine set up time, inventory turns, inventory accuracy, quality (e.g., percent defective), first pass yield, rework, scrap, failed audits, on-time delivery, customer returns, training hours, employee turnover, reportable health & safety incidents, revenue per employee, and profit per employee, schedule attainment, total cycle time, throughput, changeover time, yield, planned maintenance percentage, availability, and customer return rate.

In the present example, the digital twin dynamic model system 15508 may receive requests from a client application 15570 to populate real-time manufacturing KPI values in a manufacturing facility digital twin. At 167800, digital twin dynamic model system 15508 receives a request from the client application 15570 to update one or more KPI values of the manufacturing facility digital twin and any embedded digital twins (e.g., machines, machine parts, and the like) from the client application 15570. Next, in step 167802, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 167804, digital twin dynamic model system 15508 determines one or more dynamic models required to fulfill the request and retrieves the one or more required dynamic models from dynamic model datastore 155102. At 167806, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take one or more vibration measurements obtained from vibration sensors 15536 and other operational data as inputs and output one or more manufacturing KPIs for the facility. At 167808, digital twin dynamic model system 15508 retrieves one or more vibration measurements from each of the selected vibration sensors 15536 and operational data from digital twin I/O system 15504. At 167810, digital twin dynamic model system 15508 runs the dynamic model(s) using the retrieved vibration measurements and operational data as inputs and calculates one or more outputs that represent manufacturing KPIs for the manufacturing facility. Next, At 167812, the digital twin dynamic model system 15508 updates one or more KPI values of the manufacturing facility digital twins, machine digital twins, machine part digital twins, and all other embedded digital twins based on the one or more outputs of the dynamic model(s).

Further embodiments may include the following examples. FIG. 155 illustrates an example environment of a digital twin system 15500. In embodiments, the digital twin system 15500 generates a set of digital twins of a set of industrial environments 15520 and/or industrial entities within the set of industrial environments. In embodiments, the digital twin system 15500 maintains a set of states of the respective industrial environments 15520, such as using sensor data obtained from respective sensor systems 15530 that monitor the industrial environments 15520. In embodiments, the digital twin system 15500 may include a digital twin management system 15502, a digital twin I/O system 15504, a digital twin simulation system 15506, a digital twin dynamic model system 15508, a cognitive intelligence system 15510, and/or an environment control module 15512. In embodiments, the digital twin system 15500 may provide a real time sensor API that provides a set of capabilities for enabling a set of interfaces for the sensors of the respective sensor systems 15530. In embodiments, the digital twin system 15500 may include and/or employ other suitable APIs, brokers, connectors, bridges, gateways, hubs, ports, routers, switches, data integration systems, peer-to-peer systems, and the like to facilitate the transferring of data to and from the digital twin system 15500. In these embodiments, these connective components may allow an IoT sensor or an intermediary device (e.g., a relay, an edge device, a switch, or the like) within a sensor system 15530 to communicate data to the digital twin system 155300 and/or to receive data (e.g., configuration data, control data, or the like) from the digital twin system 15500 or another external system. In embodiments, the digital twin system 15500 may further include a digital twin datastore 15516 that stores digital twins 15518 of various industrial environments 15520 and the objects 15522, devices 15524, sensors 15526, and/or humans 15528 in the environment 15520.

A digital twin may refer to a digital representation of one or more industrial entities, such as an industrial environment 15520, a physical object 15522, a device 15524, a sensor 15526, a human 15528, or any combination thereof. Examples of industrial environments 15520 include, but are not limited to, a factory, a power plant, a food production facility (which may include an inspection facility), a commercial kitchen, an indoor growing facility, a natural resources excavation site (e.g., a mine, an oil field, etc.), and the like. Depending on the type of environment, the types of objects, devices, and sensors that are found in the environments will differ. Non-limiting examples of physical objects 15522 include raw materials, manufactured products, excavated materials, containers (e.g., boxes, dumpsters, cooling towers, vats, pallets, barrels, palates, bins, and the like), furniture (e.g., tables, counters, workstations, shelving, etc.), and the like. Non-limiting examples of devices 15524 include robots, computers, vehicles (e.g., cars, trucks, tankers, trains, forklifts, cranes, etc.), machinery/equipment (e.g., tractors, tillers, drills, presses, assembly lines, conveyor belts, etc.), and the like. The sensors 15526 may be any sensor devices and/or sensor aggregation devices that are found in a sensor system 15530 within an environment. Non-limiting examples of sensors 15526 that may be implemented in a sensor system 15530 may include temperature sensors 15532, humidity sensors 15534, vibration sensors 15536, LIDAR sensors 15538, motion sensors 15540, chemical sensors 15542, audio sensors 15544, pressure sensors 15546, weight sensors 15548, radiation sensors 15550, video sensors 15552, wearable devices 15554, relays 15556, edge devices 15558, crosspoint switches 15560, and/or any other suitable sensors. Examples of different types of physical objects 15522, devices 15524, sensors 15526, and environments 15520 are referenced throughout the disclosure.

In some embodiments, on-device sensor fusion and data storage for industrial IoT devices is supported, including on-device sensor fusion and data storage for an industrial IoT device, where data from multiple sensors is multiplexed at the device for storage of a fused data stream. For example, pressure and temperature data may be multiplexed into a data stream that combines pressure and temperature in a time series, such as in a byte-like structure (where time, pressure, and temperature are bytes in a data structure, so that pressure and temperature remain linked in time, without requiring separate processing of the streams by outside systems), or by adding, dividing, multiplying, subtracting, or the like, such that the fused data can be stored on the device. Any of the sensor data types described throughout this disclosure, including vibration data, can be fused in this manner, and stored in a local data pool, in storage, or on an IoT device, such as a data collector, a component of a machine, or the like.

In some embodiments, a set of digital twins may represent an entire organization, such as energy production organizations, oil and gas organizations, renewable energy production organizations, aerospace manufacturers, vehicle manufacturers, heavy equipment manufacturers, mining organizations, drilling organizations, offshore platform organizations, and the like. In these examples, the digital twins may include digital twins of one or more industrial facilities of the organization.

In embodiments, the digital twin management system 15502 generates digital twins. A digital twin may be comprised of (e.g., via reference) other digital twins. In this way, a discrete digital twin may be comprised of a set of other discrete digital twins. For example, a digital twin of a machine may include digital twins of sensors on the machine, digital twins of components that make up the machine, digital twins of other devices that are incorporated in or integrated with the machine (such as systems that provide inputs to the machine or take outputs from it), and/or digital twins of products or other items that are made by the machine. Taking this example one step further, a digital twin of an industrial facility (e.g., a factory) may include a digital twin representing the layout of the industrial facility, including the arrangement of physical assets and systems in or around the facility, as well as digital assets of the assets within the facility (e.g., the digital twin of the machine), as well as digital twins of storage areas in the facility, digital twins of humans collecting vibration measurements from machines throughout the facility, and the like. In this second example, the digital twin of the industrial facility may reference the embedded digital twins, which may then reference other digital twins embedded within those digital twins.

In some embodiments, a digital twin may represent abstract entities, such as workflows and/or processes, including inputs, outputs, sequences of steps, decision points, processing loops, and the like that make up such workflows and processes. For example, a digital twin may be a digital representation of a manufacturing process, a logistics workflow, an agricultural process, a mineral extraction process, or the like. In these embodiments, the digital twin may include references to the industrial entities that are included in the workflow or process. The digital twin of the manufacturing process may reflect the various stages of the process. In some of these embodiments, the digital twin system 15500 receives real-time data from the industrial facility (e.g., from a sensor system 15530 of the environment 15520) in which the manufacturing process takes place and reflects a current (or substantially current) state of the process in real-time.

In embodiments, the digital representation may include a set of data structures (e.g., classes) that collectively define a set of properties of a represented physical object 15522, device 15524, sensor 15526, or environment 15520 and/or possible behaviors thereof. For example, the set of properties of a physical object 15522 may include a type of the physical object, the dimensions of the object, the mass of the object, the density of the object, the material(s) of the object, the physical properties of the material(s), the surface of the physical object, the status of the physical object, a location of the physical object, identifiers of other digital twins contained within the object, and/or other suitable properties. Examples of behavior of a physical object may include a state of the physical object (e.g., a solid, liquid, or gas), a melting point of the physical object, a density of the physical object when in a liquid state, a viscosity of the physical object when in a liquid state, a freezing point of the physical object, a density of the physical object when in a solid state, a hardness of the physical object when in a solid state, the malleability of the physical object, the buoyancy of the physical object, the conductivity of the physical object, a burning point of the physical object, the manner by which humidity affects the physical object, the manner by which water or other liquids affect the physical object, a terminal velocity of the physical object, and the like. In another example, the set of properties of a device may include a type of the device, the dimensions of the device, the mass of the device, the density of the density of the device, the material(s) of the device, the physical properties of the material(s), the surface of the device, the output of the device, the status of the device, a location of the device, a trajectory of the device, vibration characteristics of the device, identifiers of other digital twins that the device is connected to and/or contains, and the like. Examples of the behaviors of a device may include a maximum acceleration of a device, a maximum speed of a device, ranges of motion of a device, a heating profile of a device, a cooling profile of a device, processes that are performed by the device, operations that are performed by the device, and the like. Example properties of an environment may include the dimensions of the environment, the boundaries of the environment, the temperature of the environment, the humidity of the environment, the airflow of the environment, the physical objects in the environment, currents of the environment (if a body of water), and the like. Examples of behaviors of an environment may include scientific laws that govern the environment, processes that are performed in the environment, rules or regulations that must be adhered to in the environment, and the like.

In embodiments, the properties of a digital twin may be adjusted. For example, the temperature of a digital twin, a humidity of a digital twin, the shape of a digital twin, the material of a digital twin, the dimensions of a digital twin, or any other suitable parameters may be adjusted. As the properties of the digital twin are adjusted, other properties may be affected as well. For example, if the temperature of an environment 15520 is increased, the pressure within the environment may increase as well, such as a pressure of a gas in accordance with the ideal gas law. In another example, if a digital twin of a subzero environment is increased to above freezing temperatures, the properties of an embedded twin of water in a solid state (i.e., ice) may change into a liquid state over time.

Digital twins may be represented in a number of different forms. In embodiments, a digital twin may be a visual digital twin that is rendered by a computing device, such that a human user can view digital representations of an environment 15520 and/or the physical objects 15522, devices 15524, and/or the sensors 15526 within an environment. In embodiments, the digital twin may be rendered and output to a display device. In some of these embodiments, the digital twin may be rendered in a graphical user interface, such that a user may interact with the digital twin. For example, a user may "drill down" on a particular element (e.g., a physical object or device) to view additional information regarding the element (e.g., a state of a physical object or device, properties of the physical object or device, or the like). In some embodiments, the digital twin may be rendered and output in a virtual reality display. For example, a user may view a 3D rendering of an environment (e.g., using monitor or a virtual reality headset). While doing so, the user may view/inspect digital twins of physical assets or devices in the environment.

In some embodiments, a data structure of the visual digital twins (i.e., digital twins that are configured to be displayed in a 2D or 3D manner) may include surfaces (e.g., splines, meshes, polygons meshes, or the like). In some embodiments, the surfaces may include texture data, shading information, and/or reflection data. In this way, a surface may be displayed in a more realistic manner. In some embodiments, such surfaces may be rendered by a visualization engine (not shown) when the digital twin is within a field of view and/or when existing in a larger digital twin (e.g., a digital twin of an industrial environment). In these embodiments, the digital twin system 15500 may render the surfaces of digital objects, whereby a rendered digital twin may be depicted as a set of adjoined surfaces.

In embodiments, a user may provide input that controls one or more properties of a digital twin via a graphical user interface. For example, a user may provide input that changes a property of a digital twin. In response, the digital twin system 15500 can calculate the effects of the changed property and may update the digital twin and any other digital twins affected by the change of the property.

In embodiments, a user may view processes being performed with respect to one or more digital twins (e.g., manufacturing of a product, extracting minerals from a mine or well, a livestock inspection line, and the like). In these embodiments, a user may view the entire process or specific steps within a process.

In some embodiments, a digital twin (and any digital twins embedded therein) may be represented in a non-visual representation (or "data representation"). In these embodiments, a digital twin and any embedded digital twins exist in a binary representation but the relationships between the digital twins are maintained. For example, in embodiments, each digital twin and/or the components thereof may be represented by a set of physical dimensions that define a shape of the digital twin (or component thereof). Furthermore, the data structure embodying the digital twin may include a location of the digital twin. In some embodiments, the location of the digital twin may be provided in a set of coordinates. For example, a digital twin of an industrial environment may be defined with respect to a coordinate space (e.g., a Cartesian coordinate space, a polar coordinate space, or the like). In embodiments, embedded digital twins may be represented as a set of one or more ordered triples (e.g., [x coordinate, y coordinate, z coordinates] or other vector-based representations). In some of these embodiments, each ordered triple may represent a location of a specific point (e.g., center point, top point, bottom point, or the like) on the industrial entity (e.g., object, device, or sensor) in relation to the environment in which the industrial entity resides. In some embodiments, a data structure of a digital twin may include a vector that indicates a motion of the digital twin with respect to the environment. For example, fluids (e.g., liquids or gasses) or solids may be represented by a vector that indicates a velocity (e.g., direction and magnitude of speed) of the entity represented by the digital twin. In embodiments, a vector within a twin may represent a microscopic subcomponent, such as a particle within a fluid, and a digital twin may represent physical properties, such as displacement, velocity, acceleration, momentum, kinetic energy, vibrational characteristics, thermal properties, electromagnetic properties, and the like.

In some embodiments, a set of two or more digital twins may be represented by a graph database that includes nodes and edges that connect the nodes. In some implementations, an edge may represent a spatial relationship (e.g., "abuts," "rests upon," "contains", and the like). In these embodiments, each node in the graph database represents a digital twin of an entity (e.g., an industrial entity) and may include the data structure defining the digital twin. In these embodiments, each edge in the graph database may represent a relationship between two entities represented by connected nodes. In some implementations, an edge may represent a spatial relationship (e.g., "abuts," "rests upon," "interlocks with," "bears", "contains", and the like). In embodiments, various types of data may be stored in a node or an edge. In embodiments, a node may store property data, state data, and/or metadata relating to a facility, system, subsystem, and/or component. Types of property data and state data will differ based on the entity represented by a node. For example, a node representing a robot may include property data that indicates a material of the robot, the dimensions of the robot (or components thereof), a mass of the robot, and the like. In this example, the state data of the robot may include a current pose of the robot, a location of the robot, and the like. In embodiments, an edge may store relationship data and metadata data relating to a relationship between two nodes. Examples of relationship data may include the nature of the relationship, whether the relationship is permanent (e.g., a fixed component would have a permanent relationship with the structure to which it is attached or resting on), and the like. In embodiments, an edge may include metadata concerning the relationship between two entities. For example, if a product was produced on an assembly line, one relationship that may be documented between a digital twin of the product and the assembly line may be "created by." In these embodiments, an example edge representing the "created by" relationship may include a timestamp indicating a date and time that the product was created. In another example, a sensor may take measurements relating to a state of a device, whereby one relationship between the sensor and the device may include "measured" and may define a measurement type that is measured by the sensor. In this example, the metadata stored in an edge may include a list of N measurements taken and a timestamp of each respective measurement. In this way, temporal data relating to the nature of the relationship between two entities may be maintained, thereby allowing for an analytics engine, machine-learning engine, and/or visualization engine to leverage such temporal relationship data, such as by aligning disparate data sets with a series of points in time, such as to facilitate cause-and-effect analysis used for prediction systems.

In some embodiments, a graph database may be implemented in a hierarchical manner, such that the graph database relates a set of facilities, systems, and components. For example, a digital twin of a manufacturing environment may include a node representing the manufacturing environment. The graph database may further include nodes representing various systems within the manufacturing environment, such as nodes representing an HVAC system, a lighting system, a manufacturing system, and the like, all of which may connect to the node representing the manufacturing system. In this example, each of the systems may further connect to various subsystems and/or components of the system. For example, within the HVAC system, the HVAC system may connect to a subsystem node representing a cooling system of the facility, a second subsystem node representing a heating system of the facility, a third subsystem node representing the fan system of the facility, and one or more nodes representing a thermostat of the facility (or multiple thermostats). Carrying this example further, the subsystem nodes and/or component nodes may connect to lower level nodes, which may include subsystem nodes and/or component nodes. For example, the subsystem node representing the cooling subsystem may be connected to a component node representing an air conditioner unit. Similarly, a component node representing a thermostat device may connect to one or more component nodes representing various sensors (e.g., temperature sensors, humidity sensors, and the like).

In embodiments where a graph database is implemented, a graph database may relate to a single environment or may represent a larger enterprise. In the latter scenario, a company may have various manufacturing and distribution facilities. In these embodiments, an enterprise node representing the enterprise may connect to environment nodes of each respective facility. In this way, the digital twin system 15500 may maintain digital twins for multiple industrial facilities of an enterprise.

In embodiments, the digital twin system 15500 may use a graph database to generate a digital twin that may be rendered and displayed and/or may be represented in a data representation. In the former scenario, the digital twin system 15500 may receive a request to render a digital twin, whereby the request includes one or more parameters that are indicative of a view that will be depicted. For example, the one or more parameters may indicate an industrial environment to be depicted and the type of rendering (e.g., "real-world view" that depicts the environment as a human would see it, an "infrared view" that depicts objects as a function of their respective temperature, an "airflow view" that depicts the airflow in a digital twin, or the like). In response, the digital twin system 15500 may traverse a graph database and may determine a configuration of the environment to be depicted based on the nodes in the graph database that are related (either directly or through a lower level node) to the environment node of the environment and the edges that define the relationships between the related nodes. Upon determining a configuration, the digital twin system 15500 may identify the surfaces that are to be depicted and may render those surfaces. The digital twin system 15500 may then render the requested digital twin by connecting the surfaces in accordance with the configuration. The rendered digital twin may then be output to a viewing device (e.g., VR headset, monitor, or the like). In some scenarios, the digital twin system 15500 may receive real-time sensor data from a sensor system 15530 of an environment 15520 and may update the visual digital twin based on the sensor data. For example, the digital twin system 15500 may receive sensor data (e.g., vibration data from a vibration sensor 15536) relating to a motor and its set of bearings. Based on the sensor data, the digital twin system 15500 may update the visual digital twin to indicate the approximate vibrational characteristics of the set of bearings within a digital twin of the motor.

In scenarios where the digital twin system 15500 is providing data representations of digital twins (e.g., for dynamic modeling, simulations, machine learning), the digital twin system 15500 may traverse a graph database and may determine a configuration of the environment to be depicted based on the nodes in the graph database that are related (either directly or through a lower level node) to the environment node of the environment and the edges that define the relationships between the related nodes. In some scenarios, the digital twin system 15500 may receive real-time sensor data from a sensor system 15530 of an environment 15520 and may apply one or more dynamic models to the digital twin based on the sensor data. In other scenarios, a data representation of a digital twin may be used to perform simulations, as is discussed in greater detail throughout the specification.

In some embodiments, the digital twin system 15500 may execute a digital ghost that is executed with respect to a digital twin of an industrial environment. In these embodiments, the digital ghost may monitor one or more sensors of a sensor system 15530 of an industrial environment to detect anomalies that may indicate a malicious virus or other security issues.

As discussed, the digital twin system 15500 may include a digital twin management system 15502, a digital twin I/O system 15504, a digital twin simulation system 15506, a digital twin dynamic model system 15508, a cognitive intelligence system 15510, and/or an environment control module 15512.

In embodiments, the digital twin management system 15502 creates new digital twins, maintains/updates existing digital twins, and/or renders digital twins. The digital twin management system 15502 may receive user input, uploaded data, and/or sensor data to create and maintain existing digital twins. Upon creating a new digital twin, the digital twin management system 15502 may store the digital twin in the digital twin datastore 15516. Creating, updating, and rendering digital twins are discussed in greater detail throughout the disclosure.

In embodiments, the digital twin I/O system 15504 receives input from various sources and outputs data to various recipients. In embodiments, the digital twin I/O system receives sensor data from one or more sensor systems 15530. In these embodiments, each sensor system 15530 may include one or more IoT sensors that output respective sensor data. Each sensor may be assigned an IP address or may have another suitable identifier. Each sensor may output sensor packets that include an identifier of the sensor and the sensor data. In some embodiments, the sensor packets may further include a timestamp indicating a time at which the sensor data was collected. In some embodiments, the digital twin I/O system 15504 may interface with a sensor system 15530 via the real-time sensor API 15514. In these embodiments, one or more devices (e.g., sensors, aggregators, edge devices) in the sensor system 15530 may transmit the sensor packets containing sensor data to the digital twin I/O system 15504 via the API. The digital twin I/O system may determine the sensor system 15530 that transmitted the sensor packets and the contents thereof, and may provide the sensor data and any other relevant data (e.g., time stamp, environment identifier/sensor system identifier, and the like) to the digital twin management system 15502.

In embodiments, the digital twin I/O system 15504 may receive imported data from one or more sources. For example, the digital twin system 15500 may provide a portal for users to create and manage their digital twins. In these embodiments, a user may upload one or more files (e.g., image files, LIDAR scans, blueprints, and the like) in connection with a new digital twin that is being created. In response, the digital twin I/O system 15504 may provide the imported data to the digital twin management system 15502. The digital twin I/O system 15504 may receive other suitable types of data without departing from the scope of the disclosure.

In some embodiments, the digital twin simulation system 15506 is configured to execute simulations using the digital twin. For example, the digital twin simulation system 15506 may iteratively adjust one or more parameters of a digital twin and/or one or more embedded digital twins. In embodiments, the digital twin simulation system 15506, for each set of parameters, executes a simulation based on the set of parameters and may collect the simulation outcome data resulting from the simulation. Put another way, the digital twin simulation system 15506 may collect the properties of the digital twin and the digital twins within or containing the digital twin used during the simulation as well as any outcomes stemming from the simulation. For example, in running a simulation on a digital twin of an indoor agricultural facility, the digital twin simulation system 15506 can vary the temperature, humidity, airflow, carbon dioxide and/or other relevant parameters and can execute simulations that output outcomes resulting from different combinations of the parameters. In another example, the digital twin simulation system 15506 may simulate the operation of a specific machine within an industrial facility that produces an output given a set of inputs. In some embodiments, the inputs may be varied to determine an effect of the inputs on the machine and the output thereof. In another example, the digital twin simulation system 15506 may simulate the vibration of a machine and/or machine components. In this example, the digital twin of the machine may include a set of operating parameters, interfaces, and capabilities of the machine. In some embodiments, the operating parameters may be varied to evaluate the effectiveness of the machine. The digital twin simulation system 15506 is discussed in further detail throughout the disclosure.

In embodiments, the digital twin dynamic model system 15508 is configured to model one or more behaviors with respect to a digital twin of an environment. In embodiments, the digital twin dynamic model system 15508 may receive a request to model a certain type of behavior regarding an environment or a process and may model that behavior using a dynamic model, the digital twin of the environment or process, and sensor data collected from one or more sensors that are monitoring the environment or process. For example, an operator of a machine having bearings may wish to model the vibration of the machine and bearings to determine whether the machine and/or bearings can withstand an increase in output. In this example, the digital twin dynamic model system 15508 may execute a dynamic model that is configured to determine whether an increase in output would result in adverse consequences (e.g., failures, downtime, or the like). The digital twin dynamic model system 15508 is discussed in further detail throughout the disclosure.

In embodiments, the cognitive processes system 15510 performs machine learning and artificial intelligence related tasks on behalf of the digital twin system. In embodiments, the cognitive processes system 15510 may train any suitable type of model, including but not limited to various types of neural networks, regression models, random forests, decision trees, Hidden Markov models, Bayesian models, and the like. In embodiments, the cognitive processes system 15510 trains machine learned models using the output of simulations executed by the digital twin simulation system 15506. In some of these embodiments, the outcomes of the simulations may be used to supplement training data collected from real-world environments and/or processes. In embodiments, the cognitive processes system 15510 leverages machine learned models to make predictions, identifications, classifications and provide decision support relating to the real-world environments and/or processes represented by respective digital twins.

For example, a machine-learned prediction model may be used to predict the cause of irregular vibrational patterns (e.g., a suboptimal, critical, or alarm vibration fault state) for a bearing of an engine in an industrial facility. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination of simulation data and real-world data of causes of irregular vibration patterns) to predict the cause of the irregular vibration patterns. In this example, the causes of the irregular vibrational patterns could be a loose bearing, a lack of bearing lubrication, a bearing that is out of alignment, a worn bearing, the phase of the bearing may be aligned with the phase of the engine, loose housing, loose bolt, and the like.

In another example, a machine-learned model may be used to provide decision support to bring a bearing of an engine in an industrial facility operating at a suboptimal vibration fault level state to a normal operation vibration fault level state. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination of simulation data and real-world data of solutions to irregular vibration patterns) to provide decision support in achieving a normal operation fault level state of the bearing. In this example, the decision support could be a recommendation to tighten the bearing, lubricate the bearing, re-align the bearing, order a new bearing, order a new part, collect additional vibration measurements, change operating speed of the engine, tighten housings, tighten bolts, and the like.

In another example, a machine-learned model may be used to provide decision support relating to vibration measurement collection by a worker. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination of simulation data and real-world vibration measurement history data) to provide decision support in selecting vibration measurement locations.

In yet another example, a machine-learned model may be used to identify vibration signatures associated with machine and/or machine component problems. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination of simulation data and real-world vibration measurement history data) to identify vibration signatures associated with a machine and/or machine component. The foregoing examples are non-limiting examples and the cognitive processes system 15510 may be used for any other suitable AI/machine-learning related tasks that are performed with respect to industrial facilities.

In embodiments, the environment control system 15512 controls one or more aspects of industrial facilities. In some of these embodiments, the environment control system 15512 may control one or more devices within an industrial environment. For example, the environment control system 15512 may control one or more machines within an environment, robots within an environment, an HVAC system of the environment, an alarm system of the environment, an assembly line in an environment, or the like. In embodiments, the environment control system 15512 may leverage the digital twin simulation system 15506, the digital twin dynamic model system 15508, and/or the cognitive processes system 15510 to determine one or more control instructions. In embodiments, the environment control system 15512 may implement a rules-based and/or a machine-learning approach to determine the control instructions. In response to determining a control instruction, the environment control system 15512 may output the control instruction to the intended device within a specific environment via the digital twin I/O system 15504.

FIG. 156 illustrates an example digital twin management system 15502 according to some embodiments of the present disclosure. In embodiments, the digital twin management system 15502 may include, but is not limited to, a digital twin creation module 15564, a digital twin update module 15566, and a digital twin visualization module 15568.

In embodiments, the digital twin creation module 15564 may create a set of new digital twins of a set of environments using input from users, imported data (e.g., blueprints, specifications, and the like), image scans of the environment, 3D data from a LIDAR device and/or SLAM sensor, and other suitable data sources. For example, a user (e.g., a user affiliated with an organization/customer account) may, via a client application 15570, provide input to create a new digital twin of an environment. In doing so, the user may upload 2D or 3D image scans of the environment and/or a blueprint of the environment. The user may also upload 3D data, such as taken by a camera, a LIDAR device, an IR scanner, a set of SLAM sensors, a radar device, an EMF scanner, or the like. In response to the provided data, the digital twin creation module 15564 may create a 3D representation of the environment, which may include any objects that were captured in the image data/detected in the 3D data. In embodiments, the cognitive processes system 15572 may analyze input data (e.g., blueprints, image scans, 3D data) to classify rooms, pathways, equipment, and the like to assist in the generation of the 3D representation. In some embodiments, the digital twin creation module 15564 may map the digital twin to a 3D coordinate space (e.g., a Cartesian space having x, y, and z axes).

In some embodiments, the digital twin creation module 15564 may output the 3D representation of the environment to a graphical user interface (GUI). In some of these embodiments, a user may identify certain areas and/or objects and may provide input relating to the identified areas and/or objects. For example, a user may label specific rooms, equipment, machines, and the like. Additionally or alternatively, the user may provide data relating to the identified objects and/or areas. For example, in identifying a piece of equipment, the user may provide a make/model number of the equipment. In some embodiments, the digital twin creation module 15564 may obtain information from a manufacturer of a device, a piece of equipment, or machinery. This information may include one or more properties and/or behaviors of the device, equipment, or machinery. In some embodiments, the user may, via the GUI, identify locations of sensors throughout the environment. For each sensor, the user may provide a type of sensor and related data (e.g., make, model, IP address, and the like). The digital twin creation module 15564 may record the locations (e.g., the x, y, z coordinates of the sensors) in the digital twin of the environment. In embodiments, the digital twin system 15500 may employ one or more systems that automate the population of digital twins. For example, the digital twin system 15500 may employ a machine vision-based classifier that classifies makes and models of devices, equipment, or sensors. Additionally or alternatively, the digital twin system 15500 may iteratively ping different types of known sensors to identify the presence of specific types of sensors that are in an environment. Each time a sensor responds to a ping, the digital twin system 15500 may extrapolate the make and model of the sensor.

In some embodiments, the manufacturer may provide or make available digital twins of their products (e.g., sensors, devices, machinery, equipment, raw materials, and the like). In these embodiments, the digital twin creation module 15564 may import the digital twins of one or more products that are identified in the environment and may embed those digital twins in the digital twin of the environment. In embodiments, embedding a digital twin within another digital twin may include creating a relationship between the embedded digital twin with the other digital twin. In these embodiments, the manufacturer of the digital twin may define the behaviors and/or properties of the respective products. For example, a digital twin of a machine may define the manner by which the machine operates, the inputs/outputs of the machine, and the like. In this way, the digital twin of the machine may reflect the operation of the machine given a set of inputs.

In embodiments, a user may define one or more processes that occur in an environment. In these embodiments, the user may define the steps in the process, the machines/devices that perform each step in the process, the inputs to the process, and the outputs of the process.

In embodiments, the digital twin creation module 15564 may create a graph database that defines the relationships between a set of digital twins. In these embodiments, the digital twin creation module 15564 may create nodes for the environment, systems and subsystems of the environment, devices in the environment, sensors in the environment, workers that work in the environment, processes that are performed in the environment, and the like. In embodiments, the digital twin creation module 15564 may write the graph database representing a set of digital twins to the digital twin datastore 15516.

In embodiments, the digital twin creation module 15564 may, for each node, include any data relating to the entity in the node representing the entity. For example, in defining a node representing an environment, the digital twin creation module 15564 may include the dimensions, boundaries, layout, pathways, and other relevant spatial data in the node. Furthermore, the digital twin creation module 15564 may define a coordinate space with respect to the environment. In the case that the digital twin may be rendered, the digital twin creation module 15564 may include a reference in the node to any shapes, meshes, splines, surfaces, and the like that may be used to render the environment. In representing a system, subsystem, device, or sensor, the digital twin creation module 15564 may create a node for the respective entity and may include any relevant data. For example, the digital twin creation module 15564 may create a node representing a machine in the environment. In this example, the digital twin creation module 15564 may include the dimensions, behaviors, properties, location, and/or any other suitable data relating to the machine in the node representing the machine. The digital twin creation module 15564 may connect nodes of related entities with an edge, thereby creating a relationship between the entities. In doing so, the created relationship between the entities may define the type of relationship characterized by the edge. In representing a process, the digital twin creation module 15564 may create a node for the entire process or may create a node for each step in the process. In some of these embodiments, the digital twin creation module 15564 may relate the process nodes to the nodes that represent the machinery/devices that perform the steps in the process. In embodiments, where an edge connects the process step nodes to the machinery/device that performs the process step, the edge or one of the nodes may contain information that indicates the input to the step, the output of the step, the amount of time the step takes, the nature of processing of inputs to produce outputs, a set of states or modes the process can undergo, and the like.

In embodiments, the digital twin update module 15566 updates sets of digital twins based on a current status of one or more industrial entities. In some embodiments, the digital twin update module 15566 receives sensor data from a sensor system 15530 of an industrial environment and updates the status of the digital twin of the industrial environment and/or digital twins of any affected systems, subsystems, devices, workers, processes, or the like. As discussed, the digital twin I/O system 15504 may receive the sensor data in one or more sensor packets. The digital twin I/O system 15504 may provide the sensor data to the digital twin update module 15566 and may identify the environment from which the sensor packets were received and the sensor that provided the sensor packet. In response to the sensor data, the digital twin update module 15566 may update a state of one or more digital twins based on the sensor data. In some of these embodiments, the digital twin update module 15566 may update a record (e.g., a node in a graph database) corresponding to the sensor that provided the sensor data to reflect the current sensor data. In some scenarios, the digital twin update module 15566 may identify certain areas within the environment that are monitored by the sensor and may update a record (e.g., a node in a graph database) to reflect the current sensor data. For example, the digital twin update module 15566 may receive sensor data reflecting different vibrational characteristics of a machine and/or machine components. In this example, the digital twin update module 15566 may update the records representing the vibration sensors that provided the vibration sensor data and/or the records representing the machine and/or the machine components to reflect the vibration sensor data. In another example, in some scenarios, workers in an industrial environment (e.g., manufacturing facility, industrial storage facility, a mine, a drilling operation, or the like) may be required to wear wearable devices (e.g., smart watches, smart helmets, smart shoes, or the like). In these embodiments, the wearable devices may collect sensor data relating to the worker (e.g., location, movement, heartrate, respiration rate, body temperature, or the like) and/or the environment surrounding the worker and may communicate the collected sensor data to the digital twin system 15500 (e.g., via the real-time sensor API 15514) either directly or via an aggregation device of the sensor system. In response to receiving the sensor data from the wearable device of a worker, the digital twin update module 15566 may update a digital twin of a worker to reflect, for example, a location of the worker, a trajectory of the worker, a health status of the worker, or the like. In some of these embodiments, the digital twin update module 15566 may update a node representing a worker and/or an edge that connects the node representing the environment with the collected sensor data to reflect the current status of the worker.

In some embodiments, the digital twin update module 15566 may provide the sensor data from one or more sensors to the digital twin dynamic model system 15508, which may model a behavior of the environment and/or one or more industrial entities to extrapolate additional state data.

In embodiments, the digital twin visualization module 15568 receives requests to view a visual digital twin or a portion thereof. In embodiments, the request may indicate the digital twin to be viewed (e.g., an environment identifier) . In response, the digital twin visualization module 15568 may determine the requested digital twin and any other digital twins implicated by the request. For example, in requesting to view a digital twin of an environment, the digital twin visualization module 15568 may further identify the digital twins of any industrial entities within the environment. In embodiments, the digital twin visualization module 15568 may identify the spatial relationships between the industrial entities and the environment based on, for example, the relationships defined in a graph database. In these embodiments, the digital twin visualization module 15568 can determine the relative location of embedded digital twins within the containing digital twin, relative locations of adjoining digital twins, and/or the transience of the relationship (e.g., is an object fixed to a point or does the object move). The digital twin visualization module 15568 may render the requested digital twins and any other implicated digital twin based on the identified relationships. In some embodiments, the digital twin visualization module 15568 may, for each digital twin, determine the surfaces of the digital twin. In some embodiments, the surfaces of a digital may be defined or referenced in a record corresponding to the digital twin, which may be provided by a user, determined from imported images, or defined by a manufacturer of an industrial entity. In the scenario that an object can take different poses or shapes (e.g., an industrial robot), the digital twin visualization module 15568 may determine a pose or shape of the object for the digital twin. The digital twin visualization module 15568 may embed the digital twins into the requested digital twin and may output the requested digital twin to a client application.

In some of these embodiments, the request to view a digital twin may further indicate the type of view. As discussed, in some embodiments, digital twins may be depicted in a number of different view types. For example, an environment or device may be viewed in a "real-world" view that depicts the environment or device as they typically appear, in a "heat" view that depicts the environment or device in a manner that is indicative of a temperature of the environment or device, in a "vibration" view that depicts the machines and/or machine components in an industrial environment in a manner that is indicative of vibrational characteristics of the machines and/or machine components, in a "filtered" view that only displays certain types of objects within an environment or components of a device (such as objects that require attention resulting from, for example, recognition of a fault condition, an alert, an updated report, or other factors), an augmented view that overlays data on the digital twin, and/or any other suitable view types. In embodiments, digital twins may be depicted in a number of different role-based view types. For example, a manufacturing facility device may be viewed in an "operator" view that depicts the facility in a manner that is suitable for a facility operator, a "C-Suite" view that depicts the facility in a manner that is suitable for executive-level managers, a "marketing" view that depicts the facility in a manner that is suitable for workers in sales and/or marketing roles, a "board" view that depicts the facility in a manner that is suitable for members of a corporate board, a "regulatory" view that depicts the facility in a manner that is suitable for regulatory managers, and a "human resources" view that depicts the facility in a manner that is suitable for human resources personnel. In response to a request that indicates a view type, the digital twin visualization module 15568 may retrieve the data for each digital twin that corresponds to the view type. For example, if a user has requested a vibration view of a factory floor, the digital twin visualization module 15568 may retrieve vibration data for the factory floor (which may include vibration measurements taken from different machines and/or machine components and/or vibration measurements that were extrapolated by the digital twin dynamic model system 15508 and/or simulated vibration data from digital twin simulation system 15506) as well as available vibration data for any industrial entities appearing on the factory floor. In this example, the digital twin visualization module 15568 may determine colors corresponding to each machine component on a factory floor that represent a vibration fault level state (e.g., red for alarm, orange for critical, yellow for suboptimal, and green for normal operation). The digital twin visualization module 15568 may then render the digital twins of the machine components within the environment based on the determined colors. Additionally or alternatively, the digital twin visualization module 15568 may render the digital twins of the machine components within the environment with indicators having the determined colors. For instance, if the vibration fault level state of an inbound bearing of a motor is suboptimal and the outbound bearing of the motor is critical, the digital twin visualization module 15568 may render the digital twin of the inbound bearing having an indicator in a shade of yellow (e.g., suboptimal) and the outbound bearing having an indicator in a shade of orange (e.g., critical). It is noted that in some embodiments, the digital twin system 15500 may include an analytics system (not shown) that determine the manner by which the digital twin visualization system 15568 presents information to a human user. For example, the analytics system may track outcomes relating to human interactions with real-world environments or objects in response to information presented in a visual digital twin. In some embodiments, the analytics system may apply cognitive models to determine the most effective manner to display visualized information (e.g., what colors to use to denote an alarm condition, what kind of movements or animations bring attention to an alarm condition, or the like) or audio information (what sounds to use to denote an alarm condition) based on the outcome data. In some embodiments, the analytics system may apply cognitive models to determine the most suitable manner to display visualized information based on the role of the user. In embodiments, the visualization may include display of information related to the visualized digital twins, including graphical information, graphical information depicting vibration characteristics, graphical information depicting harmonic peaks, graphical information depicting peaks, vibration severity units data, vibration fault level state data, recommendations from cognitive intelligence system 15510, predictions from cognitive intelligence system 15510, probability of failure data, maintenance history data, time to failure data, cost of downtime data, probability of downtime data, cost of repair data, cost of machine replace data, probability of shutdown data, manufacturing KPIs, and the like.

In another example, a user may request a filtered view of a digital twin of a process, whereby the digital twin of the process only shows components (e.g., machine or equipment) that are involved in the process. In this example, the digital twin visualization module 15568 may retrieve a digital twin of the process, as well as any related digital twins (e.g., a digital twin of the environment and digital twins of any machinery or devices that impact the process). The digital twin visualization module 15568 may then render each of the digital twins (e.g., the environment and the relevant industrial entities) and then may perform the process on the rendered digital twins. It is noted that as a process may be performed over a period of time and may include moving items and/or parts, the digital twin visualization module 15568 may generate a series of sequential frames that demonstrate the process. In this scenario, the movements of the machines and/or devices implicated by the process may be determined according to the behaviors defined in the respective digital twins of the machines and/or devices.

As discussed, the digital twin visualization module 15568 may output the requested digital twin to a client application 15570. In some embodiments, the client application 15570 is a virtual reality application, whereby the requested digital twin is displayed on a virtual reality headset. In some embodiments, the client application 15570 is an augmented reality application, whereby the requested digital twin is depicted in an AR-enabled device. In these embodiments, the requested digital twin may be filtered such that visual elements and/or text are overlaid on the display of the AR-enabled device.

It is noted that while a graph database is discussed, the digital twin system 15500 may employ other suitable data structures to store information relating to a set of digital twins. In these embodiments, the data structures, and any related storage system, may be implemented such that the data structures provide for some degree of feedback loops and/or recursion when representing iteration of flows.

Figure 131:
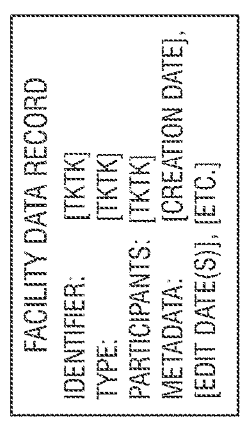
FIG. 131 depicts an example facility data record.

FIG. 131 illustrates an example of a digital twin I/O system 15504 that interfaces with the environment 15520, the digital twin system 15500, and/or components thereof to provide bi-directional transfer of data between coupled components according to some embodiments of the present disclosure.

In embodiments, the transferred data includes signals (e.g., request signals, command signals, response signals, etc.) between connected components, which may include software components, hardware components, physical devices, virtualized devices, simulated devices, combinations thereof, and the like. The signals may define material properties (e.g., physical quantities of temperature, pressure, humidity, density, viscosity, etc.), measured values (e.g., contemporaneous or stored values acquired by the device or system), device properties (e.g., device ID or properties of the device's design specifications, materials, measurement capabilities, dimensions, absolute position, relative position, combinations thereof, and the like), set points (e.g., targets for material properties, device properties, system properties, combinations thereof, and the like), and/or critical points (e.g., threshold values such as minimum or maximum values for material properties, device properties, system properties, etc.). The signals may be received from systems or devices that acquire (e.g., directly measure or generate) or otherwise obtain (e.g., receive, calculate, look-up, filter, etc.) the data, and may be communicated to or from the digital twin I/O system 15504 at predetermined times or in response to a request (e.g., polling) from the digital twin I/O system 15504. The communications may occur through direct or indirect connections (e.g., via intermediate modules within a circuit and/or intermediate devices between the connected components). The values may correspond to real-world elements 131302*r* (e.g., an input or output for a tangible vibration sensor) or virtual elements 131302*v* (e.g., an input or output for a digital twin 131302*d* and/or a simulated element 131302*s* that provide vibration data).

In embodiments, the real-world elements 131302*r* may be elements within the industrial environment 15520. The real-world elements 131302*r* may include, for example, non-networked objects 15522, the devices 15524 (smart or non-smart), sensors 15526, and humans 15528. The real-world elements 131302*r* may be process or non-process equipment within the industrial environments 15520. For example, process equipment may include motors, pumps, mills, fans, painters, welders, smelters, etc., and non-process equipment may include personal protective equipment, safety equipment, emergency stations or devices (e.g., safety showers, eyewash stations, fire extinguishers, sprinkler systems, etc.), warehouse features (e.g., walls, floor layout, etc.), obstacles (e.g., persons or other items within the environment 15520, etc.), etc.

In embodiments, the virtual elements 131302*v* may be digital representations of or that correspond to contemporaneously existing real-world elements 131302*r*. Additionally or alternatively, the virtual elements 131302*v* may be digital representations of or that correspond to real-world elements 131302*r* that may be available for later addition and implementation into the environment 15520. The virtual elements may include, for example, simulated elements 131302*s* and/or digital twins 131302*d*. In embodiments, the simulated elements 131302*s* may be digital representations of real-world elements 131302*s* that are not present within the industrial environment 15520. The simulated elements 131302*s* may mimic desired physical properties which may be later integrated within the environment 15520 as real-world elements 131302*r* (e.g., a "black box" that mimics the dimensions of a real-world elements 131302*r*). The simulated elements 131302*s* may include digital twins of existing objects (e.g., a single simulated element 131302*s* may include one or more digital twins 131302*d* for existing sensors). Information related to the simulated elements 131302*s* may be obtained, for example, by evaluating behavior of corresponding real-world elements 131302*r* using mathematical models or algorithms, from libraries that define information and behavior of the simulated elements 131302*s* (e.g., physics libraries, chemistry libraries, or the like).

In embodiments, the digital twin 131302*d* may be a digital representation of one or more real-world elements 131302*r*. The digital twins 131302*d* are configured to mimic, copy, and/or model behaviors and responses of the real-world elements 131302*r* in response to inputs, outputs, and/or conditions of the surrounding or ambient environment. Data related to physical properties and responses of the real-world elements 131302*r* may be obtained, for example, via user input, sensor input, and/or physical modeling (e.g., thermodynamic models, electrodynamic models, mechanodynamic models, etc.). Information for the digital twin 131302*d* may correspond to and be obtained from the one or more real-world elements 131302*r* corresponding to the digital twin 131302*d*. For example, in some embodiments, the digital twin 131302*d* may correspond to one real-world element 131302*r* that is a fixed digital vibration sensor 15536 on a machine component, and vibration data for the digital twin 131302*d* may be obtained by polling or fetching vibration data measured by the fixed digital vibration sensor on the machine component. In a further example, the digital twin 131302*d* may correspond to a plurality of real-world elements 131302*r* such that each of the elements can be a fixed digital vibration sensor on a machine component, and vibration data for the digital twin 131302*d* may be obtained by polling or fetching vibration data measured by each of the fixed digital vibration sensors on the plurality of real-world elements 131302*r*. Additionally or alternatively, vibration data of a first digital twin 131302*d* may be obtained by fetching vibration data of a second digital twin 157302*d* that is embedded within the first digital twin 157302*d*, and vibration data for the first digital twin 157302*d* may include or be derived from vibration data for the second digital twin 157302*d*. For example, the first digital twin may be a digital twin 157302*d* of an environment 15520 (alternatively referred to as an "environmental digital twin") and the second digital twin 157302*d* may be a digital twin 157302*d* corresponding to a vibration sensor disposed within the environment 15520 such that the vibration data for the first digital twin 157302*d* is obtained from or calculated based on data including the vibration data for the second digital twin 157302*d*.

In embodiments, the digital twin system 15500 monitors properties of the real-world elements 157302*r* using the sensors 15526 within a respective environment 15520 that is or may be represented by a digital twin 157302*d* and/or outputs of models for one or more simulated elements 157302*s*. In embodiments, the digital twin system 15500 may minimize network congestion while maintaining effective monitoring of processes by extending polling intervals and/or minimizing data transfer for sensors corresponding that correspond to affected real-world elements 157302*r* and performing simulations (e.g., via the digital-twin simulation system 15506) during the extended interval using data that was obtained from other sources (e.g., sensors that are physically proximate to or have an effect on the affected real-world elements 157302*r*). Additionally or alternatively, error checking may be performed by comparing the collected sensor data with data obtained from the digital-twin simulation system 15506. For example, consistent deviations or fluctuations between sensor data obtained from the real-world element 157302r and the simulated element 157302s may indicate malfunction of the respective sensor or another fault condition.

In embodiments, the digital twin system 15500 may optimize features of the environment through use of one or more simulated elements 157302s. For example, the digital twin system 15500 may evaluate effects of the simulated elements 157302s within a digital twin of an environment to quickly and efficiently determine costs and/or benefits flowing from inclusion, exclusion, or substitution of real-world elements 157302r within the environment 15520. The costs and benefits may include, for example, increased machinery costs (e.g., capital investment and maintenance), increased efficiency (e.g., process optimization to reduce waste or increase throughput), decreased or altered footprint within the environment 15520, extension or optimization of useful lifespans, minimization of component faults, minimization of component downtime, etc.

In embodiments, the digital twin I/O system 15504 may include one or more software modules that are executed by one or more controllers of one or more devices (e.g., server devices, user devices, and/or distributed devices) to affect the described functions. The digital twin I/O system 15504 may include, for example, an input module 157304, an output module 157306, and an adapter module 157308.

In embodiments, the input module 157304 may obtain or import data from data sources in communication with the digital twin I/O system 15504, such as the sensor system 15530 and the digital twin simulation system 15506. The data may be immediately used by or stored within the digital twin system 15500. The imported data may be ingested from data streams, data batches, in response to a triggering event, combinations thereof, and the like. The input module 157304 may receive data in a format that is suitable to transfer, read, and/or write information within the digital twin system 15500.

In embodiments, the output module 157306 may output or export data to other system components (e.g., the digital twin datastore 15516, the digital twin simulation system 15506, the cognitive intelligence system 15510, etc.), devices 15524, and/or the client application 15570. The data may be output in data streams, data batches, in response to a triggering event (e.g., a request), combinations thereof, and the like. The output module 157306 may output data in a format that is suitable to be used or stored by the target element (e.g., one protocol for output to the client application and another protocol for the digital twin datastore 15516).

In embodiments, the adapter module 157308 may process and/or convert data between the input module 157304 and the output module 157306. In embodiments, the adapter module 157308 may convert and/or route data automatically (e.g., based on data type) or in response to a received request (e.g., in response to information within the data).

In embodiments, the digital twin system 15500 may represent a set of industrial workpiece elements in a digital twin, and the digital twin simulation system 15506 simulates a set of physical interactions of a worker with the workpiece elements.

In embodiments, the digital twin simulation system 15506 may determine process outcomes for the simulated physical interactions accounting for simulated human factors. For example, variations in workpiece throughput may be modeled by the digital twin system 15500 including, for example, worker response times to events, worker fatigue, discontinuity within worker actions (e.g., natural variations in human-movement speed, differing positioning times, etc.), effects of discontinuities on downstream processes, and the like. In embodiments, individualized worker interactions may be modeled using historical data that is collected, acquired, and/or stored by the digital twin system 15500. The simulation may begin based on estimated amounts (e.g., worker age, industry averages, workplace expectations, etc.). The simulation may also individualize data for each worker (e.g., comparing estimated amounts to collected worker-specific outcomes).

In embodiments, information relating to workers (e.g., fatigue rates, efficiency rates, and the like) may be determined by analyzing performance of specific workers over time and modeling said performance.

In embodiments, the digital twin system 15500 includes a plurality of proximity sensors within the sensor system 15530. The proximity sensors are or may be configured to detect elements of the environment 15520 that are within a predetermined area. For example, proximity sensors may include electromagnetic sensors, light sensors, and/or acoustic sensors.

The electromagnetic sensors are or may be configured to sense objects or interactions via one or more electromagnetic fields (e.g., emitted electromagnetic radiation or received electromagnetic radiation). In embodiments, the electromagnetic sensors include inductive sensors (e.g., radio-frequency identification sensors), capacitive sensors (e.g., contact, and contactless capacitive sensors), combinations thereof, and the like.

The light sensors are or may be configured to sense objects or interactions via electromagnetic radiation in, for example, the far-infrared, near-infrared, optical, and/or ultraviolet spectra. In embodiments, the light sensors may include image sensors (e.g., charge-coupled devices and CMOS active-pixel sensors), photoelectric sensors (e.g., through-beam sensors, retroreflective sensors, and diffuse sensors), combinations thereof, and the like. Further, the light sensors may be implemented as part of a system or subsystem, such as a light detection and ranging ("LIDAR") sensor.

The acoustic sensors are or may be configured to sense objects or interactions via sound waves that are emitted and/or received by the acoustic sensors. In embodiments, the acoustic sensors may include infrasonic, sonic, and/or ultrasonic sensors. Further, the acoustic sensors may be grouped as part of a system or subsystem, such as a sound navigation and ranging ("SONAR") sensor.

In embodiments, the digital twin system 15500 stores and collects data from a set of proximity sensors within the environment 15520 or portions thereof. The collected data may be stored, for example, in the digital twin datastore 15516 for use by components the digital twin system 15500 and/or visualization by a user. Such use and/or visualization may occur contemporaneously with or after collection of the data (e.g., during later analysis and/or optimization of processes).

In embodiments, data collection may occur in response to a triggering condition. These triggering conditions may include, for example, expiration of a static or a dynamic predetermined interval, obtaining a value short of or in excess of a static or dynamic value, receiving an automatically generated request or instruction from the digital twin system 15500 or components thereof, interaction of an element with the respective sensor or sensors (e.g., in response to a worker or machine breaking a beam or coming within a predetermined distance from the proximity sensor), interaction of a user with a digital twin (e.g., selection of an environmental digital twin, a sensor array digital twin, or a sensor digital twin), combinations thereof, and the like.

In some embodiments, the digital twin system 15500 collects and/or stores RFID data in response to interaction of a worker with a real-world element 157302*r*. For example, in response to a worker interaction with a real-world environment, the digital twin will collect and/or store RFID data from RFID sensors within or associated with the corresponding environment 15520. Additionally or alternatively, worker interaction with a sensor-array digital twin will collect and/or store RFID data from RFID sensors within or associated with the corresponding sensor array. Similarly, worker interaction with a sensor digital twin will collect and/or store RFID data from the corresponding sensor. The RFID data may include suitable data attainable by RFID sensors such as proximate RFID tags, RFID tag position, authorized RFID tags, unauthorized RFID tags, unrecognized RFID tags, RFID type (e.g., active or passive), error codes, combinations thereof, and the like.

In embodiments, the digital twin system 15500 may further embed outputs from one or more devices within a corresponding digital twin. In embodiments, the digital twin system 15500 embeds output from a set of individual-associated devices into an industrial digital twin. For example, the digital twin I/O system 15504 may receive information output from one or more wearable devices 15554 or mobile devices (not shown) associated with an individual within an industrial environment. The wearable devices may include image capture devices (e.g., body cameras or augmented-reality headwear), navigation devices (e.g., GPS devices, inertial guidance systems), motion trackers, acoustic capture devices (e.g., microphones), radiation detectors, combinations thereof, and the like.

In embodiments, upon receiving the output information, the digital twin I/O system 15504 routes the information to the digital twin creation module 15564 to check and/or update the environment digital twin and/or associated digital twins within the environment (e.g., a digital twin of a worker, machine, or robot position at a given time). Further, the digital twin system 15500 may use the embedded output to determine characteristics of the environment 15520.

In embodiments, the digital twin system 15500 embeds output from a LIDAR point cloud system into an industrial digital twin. For example, the digital twin I/O system 15504 may receive information output from one or more Lidar devices 15538 within an industrial environment. The Lidar devices 15538 are configured to provide a plurality of points having associated position data (e.g., coordinates in absolute or relative x, y, and z values). Each of the plurality of points may include further LIDAR attributes, such as intensity, return number, total returns, laser color data, return color data, scan angle, scan direction, etc. The Lidar devices 15538 may provide a point cloud that includes the plurality of points to the digital twin system 15500 via, for example, the digital twin I/O system 15504. Additionally or alternatively, the digital twin system 15500 may receive a stream of points and assemble the stream into a point cloud, or may receive a point cloud and assemble the received point cloud with existing point cloud data, map data, or three dimensional (3D)-model data.

In embodiments, upon receiving the output information, the digital twin I/O system 15504 routes the point cloud information to the digital twin creation module 15564 to check and/or update the environment digital twin and/or associated digital twins within the environment (e.g., a digital twin of a worker, machine, or robot position at a given time). In some embodiments, the digital twin system 15500 is further configured to determine closed-shape objects within the received LIDAR data. For example, the digital twin system 15500 may group a plurality of points within the point cloud as an object and, if necessary, estimate obstructed faces of objects (e.g., a face of the object contacting or adjacent a floor or a face of the object contacting or adjacent another object such as another piece of equipment). The system may use such closed-shape objects to narrow search space for digital twins and thereby increase efficiency of matching algorithms (e.g., a shape-matching algorithm).

In embodiments, the digital twin system 15500 embeds output from a simultaneous location and mapping ("SLAM") system in an environmental digital twin. For example, the digital twin I/O system 15504 may receive information output from the SLAM system, such as Slam sensor 15562, and embed the received information within an environment digital twin corresponding to the location determined by the SLAM system. In embodiments, upon receiving the output information from the SLAM system, the digital twin I/O system 15504 routes the information to the digital twin creation module 15564 to check and/or update the environment digital twin and/or associated digital twins within the environment (e.g., a digital twin of a workpiece, furniture, movable object, or autonomous object). Such updating provides digital twins of non-connected elements (e.g., furnishings or persons) automatically and without need of user interaction with the digital twin system 15500.

In embodiments, the digital twin system 15500 can leverage known digital twins to reduce computational requirements for the Slam sensor 15562 by using suboptimal map-building algorithms. For example, the suboptimal map-building algorithms may allow for a higher uncertainty tolerance using simple bounded-region representations and identifying possible digital twins. Additionally or alternatively, the digital twin system 15500 may use a bounded-region representation to limit the number of digital twins, analyze the group of potential twins for distinguishing features, then perform higher precision analysis for the distinguishing features to identify and/or eliminate categories of, groups of, or individual digital twins and, in the event that no matching digital twin is found, perform a precision scan of only the remaining areas to be scanned.

In embodiments, the digital twin system 15500 may further reduce compute required to build a location map by leveraging data captured from other sensors within the environment (e.g., captured images or video, radio images, etc.) to perform an initial map-building process (e.g., a simple bounded-region map or other suitable photogrammetry methods), associate digital twins of known environmental objects with features of the simple bounded-region map to refine the simple bounded-region map, and perform more precise scans of the remaining simple bounded regions to further refine the map. In some embodiments, the digital twin system 15500 may detect objects within received mapping information and, for each detected object, determine whether the detected object corresponds to an existing digital twin of a real-world-element. In response to determining that the detected object does not correspond to an existing real-world-element digital twin, the digital twin system 15500 may use, for example, the digital twin creation module 15564 to generate a new digital twin corresponding to the detected object (e.g., a detected-object digital twin) and add the detected-object digital twin to the real-world-element digital twins within the digital twin datastore.

Additionally or alternatively, in response to determining that the detected object corresponds to an existing real-world-element digital twin, the digital twin system 15500 may update the real-world-element digital twin to include new information detected by the simultaneous location and mapping sensor, if any.

In embodiments, the digital twin system 15500 represents locations of autonomously or remotely moveable elements and attributes thereof within an industrial digital twin. Such movable elements may include, for example, workers, persons, vehicles, autonomous vehicles, robots, etc. The locations of the moveable elements may be updated in response to a triggering condition. Such triggering conditions may include, for example, expiration of a static or a dynamic predetermined interval, receiving an automatically generated request or instruction from the digital twin system 15500 or components thereof, interaction of an element with a respective sensor or sensors (e.g., in response to a worker or machine breaking a beam or coming within a predetermined distance from a proximity sensor), interaction of a user with a digital twin (e.g., selection of an environmental digital twin, a sensor array digital twin, or a sensor digital twin), combinations thereof, and the like.

In embodiments, the time intervals may be based on probability of the respective movable element having moved within a time period. For example, the time interval for updating a worker location may be relatively shorter for workers expected to move frequently (e.g., a worker tasked with lifting and carrying objects within and through the environment 15520) and relatively longer for workers expected to move infrequently (e.g., a worker tasked with monitoring a process stream). Additionally or alternatively, the time interval may be dynamically adjusted based on applicable conditions, such as increasing the time interval when no movable elements are detected, decreasing the time interval as or when the number of moveable elements within an environment increases (e.g., increasing number of workers and worker interactions), increasing the time interval during periods of reduced environmental activity (e.g., breaks such as lunch), decreasing the time interval during periods of abnormal environmental activity (e.g., tours, inspections, or maintenance), decreasing the time interval when unexpected or uncharacteristic movement is detected (e.g., frequent movement by a typically sedentary element or coordinated movement, for example, of workers approaching an exit or moving cooperatively to carry a large object), combinations thereof, and the like. Further, the time interval may also include additional, semi-random acquisitions. For example, occasional mid-interval locations may be acquired by the digital twin system 15500 to reinforce or evaluate the efficacy of the particular time interval.

In embodiments, the digital twin system 15500 may analyze data received from the digital twin I/O system 15504 to refine, remove, or add conditions. For example, the digital twin system 15500 may optimize data collection times for movable elements that are updated more frequently than needed (e.g., multiple consecutive received positions being identical or within a predetermined margin of error).

In embodiments, the digital twin system 15500 may receive, identify, and/or store a set of states 15540*a-n* related to the environment 15520. The states 15540*a-n* may be, for example, data structures that include a plurality of attributes 158404*a-n* and a set of identifying criteria 158406*a-n* to uniquely identify each respective state 15540*a-n*. In embodiments, the states 15540*a-n* may correspond to states where it is desirable for the digital twin system 15500 to set or alter conditions of real-world elements 157302*r* and/or the environment 15520 (e.g., increase/decrease monitoring intervals, alter operating conditions, etc.).

In embodiments, the set of states 15540*a-n* may further include, for example, minimum monitored attributes for each state 15540*a-n*, the set of identifying criteria 158406*a-n* for each state 15540*a-n*, and/or actions available to be taken or recommended to be taken in response to each state 15540*a-n*. Such information may be stored by, for example, the digital twin datastore 15516 or another datastore. The states 15540*a-n* or portions thereof may be provided to, determined by, or altered by the digital twin system 15500. Further, the set of states 15540*a-n* may include data from disparate sources. For example, details to identify and/or respond to occurrence of a first state may be provided to the digital twin system 15500 via user input, details to identify and/or respond to occurrence of a second state may be provided to the digital twin system 15500 via an external system, details to identify and/or respond to occurrence of a third state may be determined by the digital twin system 15500 (e.g., via simulations or analysis of process data), and details to identify and/or respond to occurrence of a fourth state may be stored by the digital twin system 15500 and altered as desired (e.g., in response to simulated occurrence of the state or analysis of data collected during an occurrence of and response to the state).

In embodiments, the plurality of attributes 158404*a-n* includes at least the attributes 158404*a-n* needed to identify the respective state 15540*a-n*. The plurality of attributes 158404*a-n* may further include additional attributes that are or may be monitored in determining the respective state 15540*a-n*, but are not needed to identify the respective state 15540*a-n*. For example, the plurality of attributes 158404*a-n* for a first state may include relevant information such as rotational speed, fuel level, energy input, linear speed, acceleration, temperature, strain, torque, volume, weight, etc.

The set of identifying criteria 158406*a-n* may include information for each of the set of attributes 158404*a-n* to uniquely identify the respective state. The identifying criteria 158406*a-n* may include, for example, rules, thresholds, limits, ranges, logical values, conditions, comparisons, combinations thereof, and the like.

The change in operating conditions or monitoring may be any suitable change. For example, after identifying occurrence of a respective state 158406*a-n*, the digital twin system 15500 may increase or decrease monitoring intervals for a device (e.g., decreasing monitoring intervals in response to a measured parameter differing from nominal operation) without altering operation of the device. Additionally or alternatively, the digital twin system 15500 may alter operation of the device (e.g., reduce speed or power input) without altering monitoring of the device. In further embodiments, the digital twin system 15500 may alter operation of the device (e.g., reduce speed or power input) and alter monitoring intervals for the device (e.g., decreasing monitoring intervals).

Figure 151:
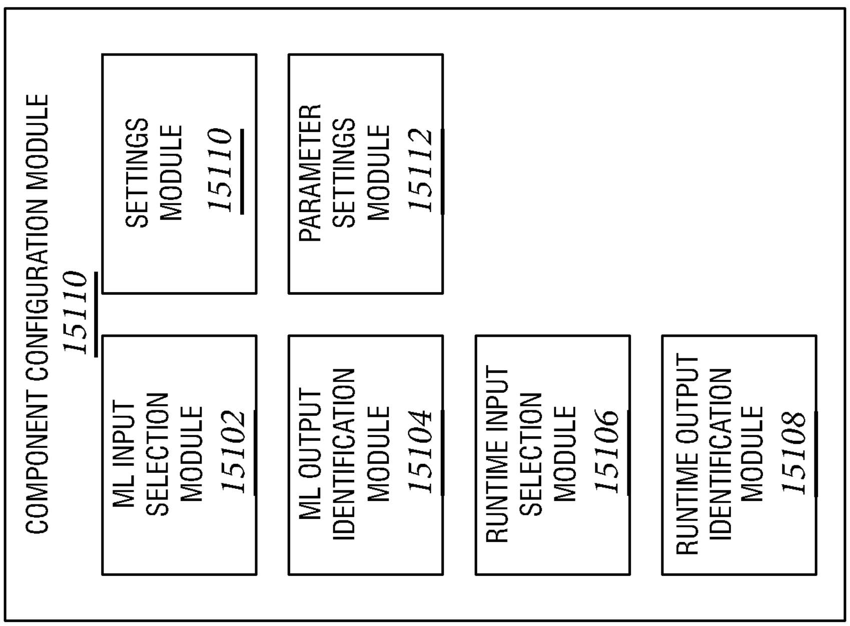

FIG. 151 illustrates an example set of identified states 15540*a-n* related to industrial environments that the digital twin system 15500 may identify and/or store for access by intelligent systems (e.g., the cognitive intelligence system 15510) or users of the digital twin system 15500, according to some embodiments of the present disclosure. The states 15540*a-n* may include operational states (e.g., suboptimal, normal, optimal, critical, or alarm operation of one or more components), excess or shortage states (e.g., supply-side, or output-side quantities), combinations thereof, and the like.

In embodiments, the digital twin system 15500 may monitor attributes 151404*a-n* of real-world elements 157302*r* and/or digital twins 157302*d* to determine the respective state 15540*a-n*. The attributes 151404*a-n* may be, for example, operating conditions, set points, critical points, status indicators, other sensed information, combinations thereof, and the like. For example, the attributes 151404*a-n* may include power input 151404*a*, operational speed 151404*b*, critical speed 151404*c*, and operational temperature 151404*d* of the monitored elements. While the illustrated example illustrates uniform monitored attributes, the monitored attributes may differ by target device (e.g., the digital twin system 15500 would not monitor rotational speed for an object with no rotatable components).

Each of the states 15540*a-n* includes a set of identifying criteria 151406*a-n* meeting particular criteria that are unique among the group of monitored states 15540*a-n*. The digital twin system 15500 may identify the overspeed state 15540*a*, for example, in response to the monitored attributes 151404*a-n* meeting a first set of identifying criteria 151406*a* (e.g., operational speed 151404*b* being higher than the critical speed 151404*c*, while the operational temperature 151404*d* is nominal).

In response to determining that one or more states 15540*a-n* exists or has occurred, the digital twin system 15500 may update triggering conditions for one or more monitoring protocols, issue an alert or notification, or trigger actions of subcomponents of the digital twin system 15500. For example, subcomponents of the digital twin system 15500 may take actions to mitigate and/or evaluate impacts of the detected states 15540*a-n*. When attempting to take actions to mitigate impacts of the detected states 15540*a-n* on real-world elements 157302*r*, the digital twin system 15500 may determine whether instructions exist (e.g., are stored in the digital twin datastore 15516) or should be developed (e.g., developed via simulation and cognitive intelligence or via user or worker input). Further, the digital twin system 15500 may evaluate impacts of the detected states 15540*a-n*, for example, concurrently with the mitigation actions or in response to determining that the digital twin system 15500 has no stored mitigation instructions for the detected states 15540*a-n*.

In embodiments, the digital twin system 15500 employs the digital twin simulation system 15506 to simulate one or more impacts, such as immediate, upstream, downstream, and/or continuing effects, of recognized states. The digital twin simulation system 15506 may collect and/or be provided with values relevant to the evaluated states 15540*a-n*. In simulating the impact of the one or more states 15540*a-n*, the digital twin simulation system 15506 may recursively evaluate performance characteristics of affected digital twins 157302*d* until convergence is achieved. The digital twin simulation system 15506 may work, for example, in tandem with the cognitive intelligence system 15510 to determine response actions to alleviate, mitigate, inhibit, and/or prevent occurrence of the one or more states 15540*a-n*. For example, the digital twin simulation system 15506 may recursively simulate impacts of the one or more states 15540*a-n* until achieving a desired fit (e.g., convergence is achieved), provide the simulated values to the cognitive intelligence system 15510 for evaluation and determination of potential actions, receive the potential actions, evaluate impacts of each of the potential actions for a respective desired fit (e.g., cost functions for minimizing production disturbance, preserving critical components, minimizing maintenance and/or downtime, optimizing system, worker, user, or personal safety, etc.).

In embodiments, the digital twin simulation system 15506 and the cognitive intelligence system 15510 may repeatedly share and update the simulated values and response actions for each desired outcome until desired conditions are met (e.g., convergence for each evaluated cost function for each evaluated action). The digital twin system 15500 may store the results in the digital twin datastore 15516 for use in response to determining that one or more states 15540*a-n* has occurred. Additionally, simulations and evaluations by the digital twin simulation system 15506 and/or the cognitive intelligence system 15510 may occur in response to occurrence or detection of the event.

In embodiments, simulations and evaluations are triggered only when associated actions are not present within the digital twin system 15500. In further embodiments, simulations and evaluations are performed concurrently with use of stored actions to evaluate the efficacy or effectiveness of the actions in real time and/or evaluate whether further actions should be employed or whether unrecognized states may have occurred. In embodiments, the cognitive intelligence system 15510 may also be provided with notifications of instances of undesired actions with or without data on the undesired aspects or results of such actions to optimize later evaluations.

In embodiments, the digital twin system 15500 evaluates and/or represents the impact of machine downtime within a digital twin of a manufacturing facility. For example, the digital twin system 15500 may employ the digital twin simulation system 15506 to simulate the immediate, upstream, downstream, and/or continuing effects of a machine downtime state 15540*b*. The digital twin simulation system 15506 may collect or be provided with performance-related values such as optimal, suboptimal, and minimum performance requirements for elements (e.g., real-world elements 157302*r* and/or nested digital twins 157302*d*) within the affected digital twins 157302*d*, and/or characteristics thereof that are available to the affected digital twins 157302*d*, nested digital twins 157302*d*, redundant systems within the affected digital twins 157302*d*, combinations thereof, and the like.

In embodiments, the digital twin system 15500 is configured to: simulate one or more operating parameters for the real-world elements in response to the industrial environment being supplied with given characteristics using the real-world-element digital twins; calculate a mitigating action to be taken by one or more of the real-world elements in response to being supplied with the contemporaneous characteristics; and actuate, in response to detecting the contemporaneous characteristics, the mitigating action. The calculation may be performed in response to detecting contemporaneous characteristics or operating parameters falling outside of respective design parameters or may be determined via a simulation prior to detection of such characteristics.

Additionally or alternatively, the digital twin system 15500 may provide alerts to one or more users or system elements in response to detecting states.

In embodiments, the digital twin I/O system 15504 includes a pathing module 157310. The pathing module 157310 may ingest navigational data from the elements 157302, provide and/or request navigational data to components of the digital twin system 15500 (e.g., the digital twin simulation system 15506, the digital twin behavior system, and/or the cognitive intelligence system 15510), and/or output navigational data to elements 157302 (e.g., to the wearable devices 15554). The navigational data may be collected or estimated using, for example, historical data, guidance data provided to the elements 157302, combinations thereof, and the like.

For example, the navigational data may be collected or estimated using historical data stored by the digital twin system 15500. The historical data may include or be processed to provide information such as acquisition time, associated elements 157302, polling intervals, task performed, laden or unladen conditions, whether prior guidance data was provided and/or followed, conditions of the environment 15520, other elements 157302 within the environment 15520, combinations thereof, and the like. The estimated data may be determined using one or more suitable pathing algorithms. For example, the estimated data may be calculated using suitable order-picking algorithms, suitable path-search algorithms, combinations thereof, and the like. The order-picking algorithm may be, for example, a largest gap algorithm, an s-shape algorithm, an aisle-by-aisle algorithm, a combined algorithm, combinations thereof, and the like. The path-search algorithms may be, for example, Dijkstra's algorithm, the A* algorithm, hierarchical path-finding algorithms, incremental path-finding algorithms, any angle path-finding algorithms, flow field algorithms, combinations thereof, and the like.

Additionally or alternatively, the navigational data may be collected or estimated using guidance data of the worker. The guidance data may include, for example, a calculated route provided to a device of the worker (e.g., a mobile device or the wearable device 15554). In another example, the guidance data may include a calculated route provided to a device of the worker that instructs the worker to collect vibration measurements from one or more locations on one or more machines along the route. The collected and/or estimated navigational data may be provided to a user of the digital twin system 15500 for visualization, used by other components of the digital twin system 15500 for analysis, optimization, and/or alteration, provided to one or more elements 157302, combinations thereof, and the like.

In embodiments, the digital twin system 15500 ingests navigational data for a set of workers for representation in a digital twin. Additionally or alternatively, the digital twin system 15500 ingests navigational data for a set of mobile equipment assets of an industrial environment into a digital twin.

In embodiments, the digital twin system 15500 ingests a system for modeling traffic of mobile elements in an industrial digital twin. For example, the digital twin system 15500 may model traffic patterns for workers or persons within the environment 15520, mobile equipment assets, combinations thereof, and the like. The traffic patterns may be estimated based on modeling traffic patterns from and historical data and contemporaneous ingested data. Further, the traffic patterns may be continuously or intermittently updated depending on conditions within the environment 15520 (e.g., a plurality of autonomous mobile equipment assets may provide information to the digital twin system 15500 at a slower update interval than the environment 15520 including both workers and mobile equipment assets).

The digital twin system 15500 may alter traffic patterns (e.g., by providing updated navigational data to one or more of the mobile elements) to achieve one or more predetermined criteria. The predetermined criteria may include, for example, increasing process efficiency, decreasing interactions between laden workers and mobile equipment assets, minimizing worker path length, routing mobile equipment around paths or potential paths of persons, combinations thereof, and the like.

In embodiments, the digital twin system 15500 may provide traffic data and/or navigational information to mobile elements in an industrial digital twin. The navigational information may be provided as instructions or rule sets, displayed path data, or selective actuation of devices. For example, the digital twin system 15500 may provide a set of instructions to a robot to direct the robot to and/or along a desired route for collecting vibration data from one or more specified locations on one or more specified machines along the route using a vibration sensor. The robot may communicate updates to the system including obstructions, reroutes, unexpected interactions with other assets within the environment 15520, etc.

In some embodiments, an ant-based system 15574 enables industrial entities, including robots, to lay a trail with one or more messages for other industrial entities, including themselves, to follow in later journeys. In embodiments, the messages include information related to vibration measurement collection. In embodiments, the messages include information related to vibration sensor measurement locations. In some embodiments, the trails may be configured to fade over time. In some embodiments, the ant-based trails may be experienced via an augmented reality system. In some embodiments, the ant-based trails may be experienced via a virtual reality system. In some embodiments, the ant-based trails may be experienced via a mixed reality system. In some embodiments, ant-based tagging of areas can trigger a pain-response and/or accumulate into a warning signal. In embodiments, the ant-based trails may be configured to generate an information filtering response. In some embodiments, the ant-based trails may be configured to generate an information filtering response wherein the information filtering response is a heightened sense of visual awareness. In some embodiments, the ant-based trails may be configured to generate an information filtering response wherein the information filtering response is a heightened sense of acoustic awareness. In some embodiments, the messages include vectorized data.

In embodiments, the digital twin system 15500 includes design specification information for representing a real-world element **157302*r* using a digital twin 157302*d*. The digital may correspond to an existing real-world element 157302*r* or a potential real-world element 157302*r*. The design specification information may be received from one or more sources. For example, the design specification information may include design parameters set by user input, determined by the digital twin system 15500 (e.g., the via digital twin simulation system 15506), optimized by users or the digital twin simulation system 15506, combinations thereof, and the like. The digital twin simulation system 15506 may represent the design specification information for the component to users, for example, via a display device or a wearable device. The design specification information may be displayed schematically (e.g., as part of a process diagram or table of information) or as part of an augmented reality or virtual reality display. The design specification information may be displayed, for example, in response to a user interaction with the digital twin system 15500 (e.g., via user selection of the element or user selection to generally include design specification information within displays). Additionally or alternatively, the design specification information may be displayed automatically, for example, upon the element coming within view of an augmented reality or virtual reality device. In embodiments, the displayed design specification information may further include indicia of information source (e.g., different displayed colors indicate user input versus digital twin system 15500** determination), indicia of mismatches (e.g., between design specification information and operational information), combinations thereof, and the like.

In embodiments, the digital twin system 15500 embeds a set of control instructions for a wearable device within an industrial digital twin, such that the control instructions are provided to the wearable device to induce an experience for a wearer of the wearable device upon interaction with an element of the industrial digital twin. The induced experience may be, for example, an augmented reality experience or a virtual reality experience. The wearable device, such as a headset, may be configured to output video, audio, and/or haptic feedback to the wearer to induce the experience. For example, the wearable device may include a display device and the experience may include display of information related to the respective digital twin. The information displayed may include maintenance data associated with the digital twin, vibration data associated with the digital twin, vibration measurement location data associated with the digital twin, financial data associated with the digital twin, such as a profit or loss associated with operation of the digital twin, manufacturing KPIs associated with the digital twin, information related to an occluded element (e.g., a sub-assembly) that is at least partially occluded by a foreground element (e.g., a housing), a virtual model of the occluded element overlaid on the occluded element and visible with the foreground element, operating parameters for the occluded element, a comparison to a design parameter corresponding to the operating parameter displayed, combinations thereof, and the like. Comparisons may include, for example, altering display of the operating parameter to change a color, size, and/or display period for the operating parameter.

In some embodiments, the displayed information may include indicia for removable elements that are or may be configured to provide access to the occluded element with each indicium being displayed proximate to or overlying the respective removable element. Further, the indicia may be sequentially displayed such that a first indicium corresponding to a first removable element (e.g., a housing) is displayed, and a second indicium corresponding to a second removable element (e.g., an access panel within the housing) is displayed in response to the worker removing the first removable element. In some embodiments, the induced experience allows the wearer to see one or more locations on a machine for optimal vibration measurement collection. In an example, the digital twin system 15500 may provide an augmented reality view that includes highlighted vibration measurement collection locations on a machine and/or instructions related to collecting vibration measurements. Furthering the example, the digital twin system 15500 may provide an augmented reality view that includes instructions related to timing of vibration measurement collection. Information utilized in displaying the highlighted placement locations may be obtained using information stored by the digital twin system 15500. In some embodiments, mobile elements may be tracked by the digital twin system 15500 (e.g., via observational elements within the environment 15520 and/or via pathing information communicated to the digital twin system 15500) and continually displayed by the wearable device within the occluded view of the worker. This optimizes movement of elements within the environment 15520, increases worker safety, and minimizes down time of elements resulting from damage.

In some embodiments, the digital twin system 15500 may provide an augmented reality view that displays mismatches between design parameters or expected parameters of real-world elements **157302*r* to the wearer. The displayed information may correspond to real-world elements 157302*r* that are not within the view of the wearer (e.g., elements within another room or obscured by machinery). This allows the worker to quickly and accurately troubleshoot mismatches to determine one or more sources for the mismatch. The cause of the mismatch may then be determined, for example, by the digital twin system 15500** and corrective actions ordered. In example embodiments, a wearer may be able to view malfunctioning subcomponents of machines without removing occluding elements (e.g., housings or shields). Additionally or alternatively, the wearer may be provided with instructions to repair the device, for example, including display of the removal process (e.g., location of fasteners to be removed), assemblies or subassemblies that should be transported to other areas for repair (e.g., dust-sensitive components), assemblies or subassemblies that need lubrication, and locations of objects for reassembly (e.g., storing location that the wearer has placed removed objects and directing the wearer or another wearer to the stored locations to expedite reassembly and minimize further disassembly or missing parts in the reassembled element). This can expedite repair work, minimize process impact, allow workers to disassemble and reassemble equipment (e.g., by coordinating disassembly without direct communication between the workers), increase equipment longevity and reliability (e.g., by assuring that all components are properly replaced prior to placing back in service), combinations thereof, and the like.

In some embodiments, the induced experience includes a virtual reality view or an augmented reality view that allows the wearer to see information related to existing or planned elements. The information may be unrelated to physical performance of the element (e.g., financial performance such as asset value, energy cost, input material cost, output material value, legal compliance, and corporate operations). One or more wearers may perform a virtual walkthrough or an augmented walkthrough of the industrial environment 15520.

In examples, the wearable device displays compliance information that expedites inspections or performance of work.

In further examples, the wearable device displays financial information that is used to identify targets for alteration or optimization. For example, a manager or officer may inspect the environment 15520 for compliance with updated regulations, including information regarding compliance with former regulations, "grandfathered," and/or excepted elements. This can be used to reduce unnecessary downtime (e.g., scheduling upgrades for the least impactful times, such as during planned maintenance cycles), prevent unnecessary upgrades (e.g., replacing grandfathered or excepted equipment), and reduce capital investment.

Referring back to FIG. 155, in embodiments, the digital twin system 15500 may include, integrate, integrate with, manage, handle, link to, take input from, provide output to, control, coordinate with, or otherwise interact with a digital twin dynamic model system 15508. The digital twin dynamic model system 15508 can update the properties of a set of digital twins of a set of industrial entities and/or environments, including properties of physical industrial assets, workers, processes, manufacturing facilities, warehouses, and the like (or any of the other types of entities or environments described in this disclosure or in the documents incorporated by reference herein) in such a manner that the digital twins may represent those industrial entities and environments, and properties or attributes thereof, in real-time or very near real-time. In some embodiments, the digital twin dynamic model system 15508 may obtain sensor data received from a sensor system 15530 and may determine one or more properties of an industrial environment or an industrial entity within an environment based on the sensor data and based on one or more dynamic models.

In embodiments, the digital twin dynamic model system 15508 may update/assign values of various properties in a digital twin and/or one or more embedded digital twins, including, but not limited to, vibration values, vibration fault level states, probability of failure values, probability of downtime values, cost of downtime values, probability of shutdown values, financial values, KPI values, temperature values, humidity values, heat flow values, fluid flow values, radiation values, substance concentration values, velocity values, acceleration values, location values, pressure values, stress values, strain values, light intensity values, sound level values, volume values, shape characteristics, material characteristics, and dimensions.

In embodiments, a digital twin may be comprised of (e.g., via reference) of other embedded digital twins. For example, a digital twin of a manufacturing facility may include an embedded digital twin of a machine and one or more embedded digital twins of one or more respective motors enclosed within the machine. A digital twin may be embedded, for example, in the memory of an industrial machine that has an onboard IT system (e.g., the memory of an Onboard Diagnostic System, control system (e.g., SCADA system) or the like). Other non-limiting examples of where a digital twin may be embedded include the following: on a wearable device of a worker; in memory on a local network asset, such as a switch, router, access point, or the like; in a cloud computing resource that is provisioned for an environment or entity; and on an asset tag or other memory structure that is dedicated to an entity.

In one example, the digital twin dynamic model system 15508 can update vibration characteristics throughout an industrial environment digital twin based on captured vibration sensor data measured at one or more locations in the industrial environment and one or more dynamic models that model vibration within the industrial environment digital twin. The industrial digital twin may, before updating, already contain information about properties of the industrial entities and/or environment that can be used to feed a dynamic model, such as information about materials, shapes/volumes (e.g., of conduits), positions, connections/interfaces, and the like, such that vibration characteristics can be represented for the entities and/or environment in the digital twin. Alternatively, the dynamic models may be configured using such information.

In embodiments, the digital twin dynamic model system 15508 can update the properties of a digital twin and/or one or more embedded digital twins on behalf of a client application 15570. In embodiments, a client application 15570 may be an application relating to an industrial component or environment (e.g., monitoring an industrial facility or a component within, simulating an industrial environment, or the like). In embodiments, the client application 15570 may be used in connection with both fixed and mobile data collection systems. In embodiments, the client application 15570 may be used in connection with Industrial Internet of Things sensor system 15530.

In embodiments, the digital twin dynamic model system 15508 leverages digital twin dynamic models 155100 to model the behavior of an industrial entity and/or environment. Dynamic models 155100 may enable digital twins to represent physical reality, including the interactions of industrial entities, by using a limited number of measurements to enrich the digital representation of an industrial entity and/or environment, such as based on scientific principles. In embodiments, the dynamic models 155100 are formulaic or mathematical models. In embodiments, the dynamic models 155100 adhere to scientific laws, laws of nature, and formulas (e.g., Newton's laws of motion, second law of thermodynamics, Bernoulli's principle, ideal gas law, Dalton's law of partial pressures, Hooke's law of elasticity, Fourier's law of heat conduction, Archimedes' principle of buoyancy, and the like). In embodiments, the dynamic models are machine-learned models.

In embodiments, the digital twin system 15500 may have a digital twin dynamic model datastore 155102 for storing dynamic models 155100 that may be represented in digital twins. In embodiments, digital twin dynamic model datastore can be searchable and/or discoverable. In embodiments, digital twin dynamic model datastore can contain metadata that allows a user to understand what characteristics a given dynamic model can handle, what inputs are required, what outputs are provided, and the like. In some embodiments, digital twin dynamic model datastore 155102 can be hierarchical (such as where a model can be deepened or made more simple based on the extent of available data and/or inputs, the granularity of the inputs, and/or situational factors (such as where something becomes of high interest and a higher fidelity model is accessed for a period of time).

In embodiments, a digital twin or digital representation of an industrial entity or facility may include a set of data structures that collectively define a set of properties of a represented physical industrial asset, device, worker, process, facility, and/or environment, and/or possible behaviors thereof. In embodiments, the digital twin dynamic model system 15508 may leverage the dynamic models 155100 to inform the set of data structures that collectively define a digital twin with real-time data values. The digital twin dynamic models 155100 may receive one or more sensor measurements, Industrial Internet of Things device data, and/or other suitable data as inputs and calculate one or more outputs based on the received data and one or more dynamic models 155100. The digital twin dynamic model system 15508 then uses the one or more outputs to update the digital twin data structures.

In one example, the set of properties of a digital twin of an industrial asset that may be updated by the digital twin dynamic model system 15508 using dynamic models 155100 may include the vibration characteristics of the asset, temperature(s) of the asset, the state of the asset (e.g., a solid, liquid, or gas), the location of the asset, the displacement of the asset, the velocity of the asset, the acceleration of the asset, probability of downtime values associated with the asset, cost of downtime values associated with the asset, probability of shutdown values associated with the asset, manufacturing KPIs associated with the asset, financial information associated with the asset, heat flow characteristics associated with the asset, fluid flow rates associated with the asset (e.g., fluid flow rates of a fluid flowing through a pipe), identifiers of other digital twins embedded within the digital twin of the asset and/or identifiers of digital twins embedding the digital twin of the asset, and/or other suitable properties. Dynamic models 155100 associated with a digital twin of an asset can be configured to calculate, interpolate, extrapolate, and/or output values for such asset digital twin properties based on input data collected from sensors and/or devices disposed in the industrial setting and/or other suitable data and subsequently populate the asset digital twin with the calculated values.

In some embodiments, the set of properties of a digital twin of an industrial device that may be updated by the digital twin dynamic model system 15508 using dynamic models 155100 may include the status of the device, a location of the device, the temperature(s) of a device, a trajectory of the device, identifiers of other digital twins that the digital twin of the device is embedded within, embeds, is linked to, includes, integrates with, takes input from, provides output to, and/or interacts with and the like. Dynamic models 155100 associated with a digital twin of a device can be configured to calculate or output values for these device digital twin properties based on input data and subsequently update the device digital twin with the calculated values.

In some embodiments, the set of properties of a digital twin of an industrial worker that may be updated by the digital twin dynamic model system 15508 using dynamic models 155100 may include the status of the worker, the location of the worker, a stress measure for the worker, a task being performed by the worker, a performance measure for the worker, and the like. Dynamic models associated with a digital twin of an industrial worker can be configured to calculate or output values for such properties based on input data, which then may be used to populate industrial worker digital twin. In embodiments, industrial worker dynamic models (e.g., psychometric models) can be configured to predict reactions to stimuli, such as cues that are given to workers to direct them to undertake tasks and/or alerts or warnings that are intended to induce safe behavior. In embodiments, industrial worker dynamic models may be workflow models (Gantt charts and the like), failure mode effects analysis models (FMEA), biophysical models (such as to model worker fatigue, energy utilization, hunger), and the like.

Example properties of a digital twin of an industrial environment that may be updated by the digital twin dynamic model system 15508 using dynamic models 155100 may include the dimensions of the industrial environment, the temperature(s) of the industrial environment, the humidity value(s) of the industrial environment, the fluid flow characteristics in the industrial environment, the heat flow characteristics of the industrial environment, the lighting characteristics of the industrial environment, the acoustic characteristics of the industrial environment the physical objects in the environment, processes occurring in the industrial environment, currents of the industrial environment (if a body of water), and the like. Dynamic models associated with a digital twin of an industrial environment can be configured to calculate or output these properties based on input data collected from sensors and/or devices disposed in the industrial environment and/or other suitable data and subsequently populate the industrial environment digital twin with the calculated values.

In embodiments, dynamic models 155100 may adhere to physical limitations that define boundary conditions, constants, or variables for digital twin modeling. For example, the physical characterization of a digital twin of an industrial entity or industrial environment may include a gravity constant (e.g., 9.8 m/s2), friction coefficients of surfaces, thermal coefficients of materials, maximum temperatures of assets, maximum flow capacities, and the like. Additionally or alternatively, the dynamic models may adhere to the laws of nature. For example, dynamic models may adhere to the laws of thermodynamics, laws of motion, laws of fluid dynamics, laws of buoyancy, laws of heat transfer, laws of radiation, laws of quantum dynamics, and the like. In some embodiments, dynamic models may adhere to biological aging theories or mechanical aging principles. Thus, when the digital twin dynamic model system 15508 facilitates a real-time digital representation, the digital representation may conform to dynamic models, such that the digital representations mimic real world conditions. In some embodiments, the output(s) from a dynamic model can be presented to a human user and/or compared against real-world data to ensure convergence of the dynamic models with the real world. Furthermore, as dynamic models are based partly on assumptions, the properties of a digital twin may be improved and/or corrected when a real-world behavior differs from that of the digital twin. In embodiments, additional data collection and/or instrumentation can be recommended based on the recognition that an input is missing from a desired dynamic model, that a model in operation is not working as expected (perhaps due to missing and/or faulty sensor information), that a different result is needed (such as due to situational factors that make something of high interest), and the like.

Dynamic models may be obtained from a number of different sources. In some embodiments, a user can upload a model created by the user or a third party. Additionally or alternatively, the models may be created on the digital twin system using a graphical user interface. The dynamic models may include bespoke models that are configured for a particular environment and/or set of industrial entities and/or agnostic models that are applicable to similar types of digital twins. The dynamic models may be machine-learned models.

FIG. 159 illustrates example embodiments of a method for updating a set of properties of a digital twin and/or one or more embedded digital twins on behalf of client applications 15570. In embodiments, digital twin dynamic model system 15508 leverages one or more dynamic models 155100 to update a set of properties of a digital twin and/or one or more embedded digital twins on behalf of client application 15570 based on the impact of collected sensor data from sensor system 15530, data collected from Internet of Things connected devices 15524, and/or other suitable data in the set of dynamic models 155100 that are used to enable the industrial digital twins. In embodiments, the digital twin dynamic model system 15508 may be instructed to run specific dynamic models using one or more digital twins that represent physical industrial assets, devices, workers, processes, and/or industrial environments that are managed, maintained, and/or monitored by the client applications 15570.

In embodiments, the digital twin dynamic model system 15508 may obtain data from other types of external data sources that are not necessarily industrial-related data sources, but may provide data that can be used as input data for the dynamic models. For example, weather data, news events, social media data, and the like may be collected, crawled, subscribed to, and the like to supplement sensor data, Industrial Internet of Things device data, and/or other data that is used by the dynamic models. In embodiments, the digital twin dynamic model system 15508 may obtain data from a machine vision system. The machine vision system may use video and/or still images to provide measurements (e.g., locations, statuses, and the like) that may be used as inputs by the dynamic models.

In embodiments, the digital twin dynamic model system 15508 may feed this data into one or more of the dynamic models discussed above to obtain one or more outputs. These outputs may include calculated vibration fault level states, vibration severity unit values, vibration characteristics, probability of failure values, probability of downtime values, probability of shutdown values, cost of downtime values, cost of shutdown values, time to failure values, temperature values, pressure values, humidity values, precipitation values, visibility values, air quality values, strain values, stress values, displacement values, velocity values, acceleration values, location values, performance values, financial values, manufacturing KPI values, electrodynamic values, thermodynamic values, fluid flow rate values, and the like. The client application 15570 may then initiate a digital twin visualization event using the results obtained by the digital twin dynamic model system 15508. In embodiments, the visualization may be a heat map visualization.

In embodiments, the digital twin dynamic model system 15508 may receive requests to update one or more properties of digital twins of industrial entities and/or environments such that the digital twins represent the industrial entities and/or environments in real-time. At 159100, the digital twin dynamic model system 15508 receives a request to update one or more properties of one or more of the digital twins of industrial entities and/or environments. For example, the digital twin dynamic model system 15508 may receive the request from a client application 15570 or from another process executed by the digital twin system 15500 (e.g., a predictive maintenance process). The request may indicate the one or more properties and the digital twin or digital twins implicated by the request. In step 159102, the digital twin dynamic model system 15508 determines the one or more digital twins required to fulfill the request and retrieves the one or more required digital twins, including any embedded digital twins, from digital twin datastore 15516. At 159104, digital twin dynamic model system 15508 determines one or more dynamic models required to fulfill the request and retrieves the one or more required dynamic models from digital twin dynamic model store 155102. At 159106, the digital twin dynamic model system 15508 selects one or more sensors from sensor system 15530, data collected from Internet of Things connected devices 15524, and/or other data sources from digital twin I/O system 15504 based on available data sources and the one or more required inputs of the dynamic model(s). In embodiments, the data sources may be defined in the inputs required by the one or more dynamic models or may be selected using a lookup table. At 159108, the digital twin dynamic model system 15508 retrieves the selected data from digital twin I/O system 15504. At 159110, digital twin dynamic model system 15508 runs the dynamic model(s) using the retrieved input data (e.g., vibration sensor data, Industrial Internet of Things device data, and the like) as inputs and determines one or more output values based on the dynamic model(s) and the input data. At 159112, the digital twin dynamic model system 15508 updates the values of one or more properties of the one or more digital twins based on the one or more outputs of the dynamic model(s).

In example embodiments, client application 15570 may be configured to provide a digital representation and/or visualization of the digital twin of an industrial entity. In embodiments, the client application 15570 may include one or more software modules that are executed by one or more server devices. These software modules may be configured to quantify properties of the digital twin, model properties of a digital twin, and/or to visualize digital twin behaviors. In embodiments, these software modules may enable a user to select a particular digital twin behavior visualization for viewing. In embodiments, these software modules may enable a user to select to view a digital twin behavior visualization playback. In some embodiments, the client application 15570 may provide a selected behavior visualization to digital twin dynamic model system 15508.

In embodiments, the digital twin dynamic model system 15508 may receive requests from client application 15570 to update properties of a digital twin in order to enable a digital representation of an industrial entity and/or environment wherein the real-time digital representation is a visualization of the digital twin. In embodiments, a digital twin may be rendered by a computing device, such that a human user can view the digital representations of real-world industrial assets, devices, workers, processes and/or environments. For example, the digital twin may be rendered and outcome to a display device. In embodiments, dynamic model outputs and/or related data may be overlaid on the rendering of the digital twin. In embodiments, dynamic model outputs and/or related information may appear with the rendering of the digital twin in a display interface. In embodiments, the related information may include real-time video footage associated with the real-world entity represented by the digital twin. In embodiments, the related information may include a sum of each of the vibration fault level states in the machine. In embodiments, the related information may be graphical information. In embodiments, the graphical information may depict motion and/or motion as a function of frequency for individual machine components. In embodiments, graphical information may depict motion and/or motion as a function of frequency for individual machine components, wherein a user is enabled to select a view of the graphical information in the x, y, and z dimensions. In embodiments, graphical information may depict motion and/or motion as a function of frequency for individual machine components, wherein the graphical information includes harmonic peaks and peaks. In embodiments, the related information may be cost data, including the cost of downtime per day data, cost of repair data, cost of new part data, cost of new machine data, and the like. In embodiments, related information may be a probability of downtime data, probability of failure data, and the like. In embodiments, related information may be time to failure data.

In embodiments, the related information may be recommendations and/or insights. For example, recommendations or insights received from the cognitive intelligence system related to a machine may appear with the rendering of the digital twin of a machine in a display interface.

In embodiments, clicking, touching, or otherwise interacting with the digital twin rendered in the display interface can allow a user to "drill down" and see underlying subsystems or processes and/or embedded digital twins. For example, in response to a user clicking on a machine bearing rendered in the digital twin of a machine, the display interface can allow a user to drill down and see information related to the bearing, view a 3D visualization of the bearing's vibration, and/or view a digital twin of the bearing.

In embodiments, clicking, touching, or otherwise interacting with information related to the digital twin rendered in the display interface can allow a user to "drill down" and see underlying information.

FIG. 160 illustrates example embodiments of a display interface that renders the digital twin of a dryer centrifuge and other information related to the dryer centrifuge.

In some embodiments, the digital twin may be rendered and output in a virtual reality display. For example, a user may view a 3D rendering of an environment (e.g., using a monitor or a virtual reality headset). The user may also inspect and/or interact with digital twins of industrial entities. In embodiments, a user may view processes being performed with respect to one or more digital twins (e.g., collecting measurements, movements, interactions, inventorying, loading, packing, shipping, and the like). In embodiments, a user may provide input that controls one or more properties of a digital twin via a graphical user interface.

In some embodiments, the digital twin dynamic model system 15508 may receive requests from client application 15570 to update properties of a digital twin in order to enable a digital representation of industrial entities and/or environments wherein the digital representation is a heat map visualization of the digital twin. In embodiments, a platform is provided having heat maps displaying collected data from the sensor system 15530, Internet of Things connected devices 15524, and data outputs from dynamic models 155100 for providing input to a display interface. In embodiments, the heat map interface is provided as an output for digital twin data, such as for handling and providing information for visualization of various sensor data, dynamic model output data, and other data (such as map data, analog sensor data, and other data), such as to another system, such as a mobile device, tablet, dashboard, computer, AR/VR device, or the like. A digital twin representation may be provided in a form factor (e.g., user device, VR-enabled device, AR-enabled device, or the like) suitable for delivering visual input to a user, such as the presentation of a map that includes indicators of levels of analog sensor data, digital sensor data, and output values from the dynamic models (such as data indicating vibration fault level states, vibration severity unit values, probability of downtime values, cost of downtime values, probability of shutdown values, time to failure values, probability of failure values, manufacturing KPIs, temperatures, levels of rotation, vibration characteristics, fluid flow, heating or cooling, pressure, substance concentrations, and many other output values). In embodiments, signals from various sensors or input sources (or selective combinations, permutations, mixes, and the like) as well as data determined by the digital twin dynamic model system 15508 may provide input data to a heat map. Coordinates may include real world location coordinates (such as geo-location or location on a map of an environment), as well as other coordinates, such as time-based coordinates, frequency-based coordinates, or other coordinates that allow for representation of analog sensor signals, digital signals, dynamic model outputs, input source information, and various combinations, in a map-based visualization, such that colors may represent varying levels of input along the relevant dimensions. For example, among many other possibilities, if an industrial machine component is at a critical vibration fault level state, the heat map interface may alert a user by showing the machine component in orange. In the example of a heat map, clicking, touching, or otherwise interacting with the heat map can allow a user to drill down and see underlying sensor, dynamic model outputs, or other input data that is used as an input to the heat map display. In other examples, such as ones where a digital twin is displayed in a VR or AR environment, if an industrial machine component is vibrating outside of normal operation (e.g., at a suboptimal, critical, or alarm vibration fault level), a haptic interface may induce vibration when a user touches a representation of the machine component, or if a machine component is operating in an unsafe manner, a directional sound signal may direct a user's attention toward the machine in digital twin, such as by playing in a particular speaker of a headset or other sound system.

In embodiments, the digital twin dynamic model system 15508 may take a set of ambient environmental data and/or other data and automatically update a set of properties of a digital twin of an industrial entity or facility based on the impact of the environmental data and/or other data in the set of dynamic models 155100 that are used to enable the digital twin. Ambient environmental data may include temperature data, pressure data, humidity data, wind data, rainfall data, tide data, storm surge data, cloud cover data, snowfall data, visibility data, water level data, and the like. Additionally or alternatively, the digital twin dynamic model system 15508 may use a set of environmental data measurements collected by a set of Internet of Things connected devices 15524 disposed in an industrial setting as inputs for the set of dynamic models 155100 that are used to enable the digital twin. For example, digital twin dynamic model system 15508 may feed the dynamic models 155100 data collected, handled or exchanged by Internet of Things connected devices 15524, such as cameras, monitors, embedded sensors, mobile devices, diagnostic devices and systems, instrumentation systems, telematics systems, and the like, such as for monitoring various parameters and features of machines, devices, components, parts, operations, functions, conditions, states, events, workflows and other elements (collectively encompassed by the term "states") of industrial environments. Other examples of Internet of Things connected devices include smart fire alarms, smart security systems, smart air quality monitors, smart/learning thermostats, and smart lighting systems.

FIG. 161 illustrates example embodiments of a method for updating a set of vibration fault level states for a set of bearings in a digital twin of a machine. In this example, a client application 15570, which interfaces with digital twin dynamic model system 15508, may be configured to provide a visualization of the fault level states of the bearings in the digital twin of the machine.

In this example, the digital twin dynamic model system 15508 may receive requests from client application 15570 to update the vibration fault level states of the machine digital twin. At 161200, digital twin dynamic model system 15508 receives a request from client application 15570 to update one or more vibration fault level states of the machine digital twin. Next, in step 161202, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins, such as any embedded motor digital twins and bearing digital twins, and any digital twins that embed the machine digital twin, such as the manufacturing facility digital twin. At 161204, digital twin dynamic model system 15508 determines one or more dynamic models required to fulfill the request and retrieves the one or more required dynamic models from the digital twin dynamic model datastore 155102. At 161206, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the and the one or more required inputs of the dynamic model(s). In the present example, the retrieved dynamic model(s) 155100 may take one or more vibration sensor measurements from vibration sensors 15536 as inputs to the dynamic models. In embodiments, vibration sensors 15536 may be optical vibration sensors, single axis vibration sensors, tri-axial vibration sensors, and the like. At 161208, digital twin dynamic model system 15508 retrieves one or more measurements from each of the selected data sources from the digital twin I/O system 15504. Next, At 161210, digital twin dynamic model system 15508 runs the dynamic model(s), using the retrieved vibration sensor measurements as inputs, and calculates one or more outputs that represent bearing vibration fault level states. Next, At 161212, the digital twin dynamic model system 15508 updates one or more bearing fault level states of the manufacturing facility digital twin, machine digital twin, motor digital twin, and/or bearing digital twins based on the one or more outputs of the dynamic model(s). The client application 15570 may obtain vibration fault level states of the bearings and may display the obtained vibration fault level state associated with each bearing and/or display colors associated with fault level severity (e.g., red for alarm, orange for critical, yellow for suboptimal, green for normal operation) in the rendering of one or more of the digital twins on a display interface.

In another example, a client application 15570 may be an augmented reality application. In some embodiments of this example, the client application 15570 may obtain vibration fault level states of bearings in a field of view of an AR-enabled device (e.g., smart glasses) hosting the client application from the digital twin of the industrial environment (e.g., via an API of the digital twin system 15500) and may display the obtained vibration fault level states on the display of the AR-enabled device, such that the vibration fault level state displayed corresponds to the location in the field of view of the AR-enabled device. In this way, a vibration fault level state may be displayed even if there are no vibration sensors located within the field of view of the AR-enabled device.

FIG. 155 illustrates example embodiments of a method for updating a set of vibration severity unit values of bearings in a digital twin of a machine. Vibration severity units may be measured as displacement, velocity, and acceleration.

In this example, client application 15570 that interfaces with the digital twin dynamic model system 15508 may be configured to provide a visualization of the three-dimensional vibration characteristics of bearings in a digital twin of a machine.

In this example, the digital twin dynamic model system 15508 may receive requests from client application 15570 to update the vibration severity unit values for bearings in the digital twin of a machine. At 155300, digital twin dynamic model system 15508 receives a request from client application 15570 to update one or more vibration severity unit value(s) of the manufacturing facility digital twin. Next, in step 155302, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins (e.g., digital twins of bearings and other components). At 155304, digital twin dynamic model system 15508 determines one or more dynamic models required to fulfill the request and retrieves the one or more required dynamic models from dynamic model datastore 155102. At 155306, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the one or more required inputs of the dynamic model(s). In the present example, the retrieved dynamic models may be configured to take one or more vibration sensor measurements as inputs and provide severity unit values for bearings in the machine. At 155308, digital twin dynamic model system 15508 retrieves one or more measurements from each of the selected sensors. In the present example, the digital twin dynamic model system 15508 retrieves measurements from vibration sensors 15536 via digital twin I/O system 15504. At 155310, digital twin dynamic model system 15508 runs the dynamic model(s) using the retrieved vibration measurements as inputs and calculates one or more output values that represent vibration severity unit values for bearings in the machine. Next, at 155312, the digital twin dynamic model system 15508 updates one or more vibration severity unit values of the bearings in the machine digital twin and all other embedded digital twins or digital twins that embed the machine digital twin based on the one or more values output by the dynamic model(s).

FIG. 163 illustrates example embodiments of a method for updating a set of probability of failure values for machine components in the digital twin of a machine.

In this example, the digital twin dynamic model system 15508 may receive requests from client application 15570 to update the probability of failure values for components in a machine digital twin. At 163400, digital twin dynamic model system 15508 receives a request from client application 15570 to update one or more probability of failure value(s) of the machine digital twin, any embedded component digital twins, and any digital twins that embed the machine digital twin such as a manufacturing facility digital twin. Next, in step 163402, digital twin dynamic model system 15508 determines the one or more digital twins required to fulfill the request and retrieves the one or more required digital twins. In this example, the digital twin dynamic model system 15508 may retrieve the digital twin of the manufacturing facility, the digital twin of the machine, and the digital twins of machine components from digital twin datastore 15516. At 163404, digital twin dynamic model system 15508 determines one or more dynamic models required to fulfill the request and retrieves the one or more required dynamic models from dynamic model datastore 155102. At 163406, the digital twin dynamic model system 15508 selects, via digital twin I/O system 15504, dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s). In the present example, the retrieved dynamic models may take one or more vibration measurements from vibration sensors 15536 and historical failure data as dynamic model inputs and output probability of failure values for the machine components in the digital twin of the machine. At 163408, digital twin dynamic model system 15508 retrieves data from each of the selected sensors and/or Internet of Things connected devices via digital twin I/O system 15504. At 163410, digital twin dynamic model system 15508 runs the dynamic model(s) using the retrieved vibration data and historical failure data as inputs and calculates one or more outputs that represent probability of failure values for bearings in the machine digital twin. Next, At 163412, the digital twin dynamic model system 15508 updates one or more probability of failure values of the bearings in the machine digital twin, all embedded digital twins, and all digital twins that embed the machine digital twin based on the output of the dynamic model(s).

FIG. 164 illustrates example embodiments of a method for updating a set of probability of downtime for machines in the digital twin of a manufacturing facility.

In this example, client application 15570, which interfaces with the digital twin dynamic model system 15508, may be configured to provide a visualization of the probability of downtime values of a manufacturing facility in the digital twin of the manufacturing facility.

In this example, the digital twin dynamic model system 15508 may receive requests from client application 15570 to assign probability of downtime values to machines in a manufacturing facility digital twin. At 164500, digital twin dynamic model system 15508 receives a request from client application 15570 to update one or more probability of downtime values of machines in the manufacturing facility digital twin and any embedded digital twins such as the individual machine digital twins. Next, in step 164502, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the manufacturing facility and any embedded digital twins from digital twin datastore 15516. At 164504, digital twin dynamic model system 15508 determines one or more dynamic models required to fulfill the request and retrieves the one or more required dynamic models from dynamic model datastore 155102. At 164506, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the dynamic model(s) may be configured to take vibration measurements from vibration sensors and historical downtime data as inputs and output probability of downtime values for different machines throughout the manufacturing facility. At 164508, digital twin dynamic model system 15508 retrieves one or more measurements from each of the selected sensors via digital twin I/O system 15504. At 164510, digital twin dynamic model system 15508 runs the dynamic model(s) using the retrieved vibration measurements and historical downtime data as inputs and calculates one or more outputs that represent probability of downtime values for machines in the manufacturing facility. Next, At 164512, the digital twin dynamic model system 15508 updates one or more probability of downtime values for machines in the manufacturing facility digital twins and all embedded digital twins based on the one or more outputs of the dynamic models.

FIG. 165 illustrates example embodiments of a method for updating one or more probability of shutdown values in the digital twin of an enterprise having a set of manufacturing facilities.

In the present example, the digital twin dynamic model system 15508 may receive requests from client application 15570 to update the probability of shutdown values for the set of manufacturing facilities within an enterprise digital twin. At 165600, digital twin dynamic model system 15508 receives a request from client application 15570 to update one or more probability of shutdown values of the enterprise digital twin and any embedded digital twins. Next, in step 165602, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the enterprise and any embedded digital twins. At 165604, digital twin dynamic model system 15508 determines one or more dynamic models required to fulfill the request and retrieves the one or more required dynamic models from dynamic model datastore 155102. At 165606, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic models may be configured to take one or more vibration measurements from vibration sensors 15536 and/or other suitable data as inputs and output probability of shutdown values for each manufacturing entity in the enterprise digital twin. At 165608, digital twin dynamic model system 15508 retrieves one or more vibration measurements from each of the selected vibration sensors 15536 from digital twin I/O system 15504. At 165610, digital twin dynamic model system 15508 runs the dynamic model(s) using the retrieved vibration measurements and historical shut down data as inputs and calculates one or more outputs that represent probability of shutdown values for manufacturing facilities within the enterprise digital twin. Next, At 165612, the digital twin dynamic model system 15508 updates one or more probability of shutdown values of the enterprise digital twin and all embedded digital twins based on the one or more outputs of the dynamic model(s).

FIG. 159 illustrates example embodiments of a method for updating a set of cost of downtime values in machines in the digital twin of a manufacturing facility. In embodiments, the manufacturing In the present example, the digital twin dynamic model system 15508 may receive requests from a client application 15570 to populate real-time cost of downtime values associated with machines in a manufacturing facility digital twin. At 159700, digital twin dynamic model system 15508 receives a request from the client application 15570 to update one or more cost of downtime values of the manufacturing facility digital twin and any embedded digital twins (e.g., machines, machine parts, and the like) from the client application 15570. Next, in step 159702, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 159704, digital twin dynamic model system 15508 determines one or more dynamic models required to fulfill the request and retrieves the one or more required dynamic models from dynamic model datastore 155102. At 159706, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take historical downtime data and operational data as inputs and output data representing cost of downtime per day for machines in the manufacturing facility. At 159708, digital twin dynamic model system 15508 retrieves historical downtime data and operational data from digital twin I/O system 15504. At 159710, digital twin dynamic model system 15508 runs the dynamic model(s) using the retrieved data as input and calculates one or more outputs that represent cost of downtime per day for machines in the manufacturing facility. Next, at 159712, the digital twin dynamic model system 15508 updates one or more cost of downtime values of the manufacturing facility digital twins and machine digital twins based on the one or more outputs of the dynamic model(s).

FIG. 160 illustrates example embodiments of a method for updating a set of manufacturing KPI values in the digital twin of a manufacturing facility. In embodiments, the manufacturing KPI is selected from the set of uptime, capacity utilization, on standard operating efficiency, overall operating efficiency, overall equipment effectiveness, machine downtime, unscheduled downtime, machine set up time, inventory turns, inventory accuracy, quality (e.g., percent defective), first pass yield, rework, scrap, failed audits, on-time delivery, customer returns, training hours, employee turnover, reportable health & safety incidents, revenue per employee, and profit per employee, schedule attainment, total cycle time, throughput, changeover time, yield, planned maintenance percentage, availability, and customer return rate.

In the present example, the digital twin dynamic model system 15508 may receive requests from a client application 15570 to populate real-time manufacturing KPI values in a manufacturing facility digital twin. At 159700, digital twin dynamic model system 15508 receives a request from the client application 15570 to update one or more KPI values of the manufacturing facility digital twin and any embedded digital twins (e.g., machines, machine parts, and the like) from the client application 15570. Next, in step 159702, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 159704, digital twin dynamic model system 15508 determines one or more dynamic models required to fulfill the request and retrieves the one or more required dynamic models from dynamic model datastore 155102. At 159706, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take one or more vibration measurements obtained from vibration sensors 15536 and other operational data as inputs and output one or more manufacturing KPIs for the facility. At 167708, digital twin dynamic model system 15508 retrieves one or more vibration measurements from each of the selected vibration sensors 15536 and operational data from digital twin I/O system 15504. At 159710, digital twin dynamic model system 15508 runs the dynamic model(s) using the retrieved vibration measurements and operational data as inputs and calculates one or more outputs that represent manufacturing KPIs for the manufacturing facility. Next, At 159712, the digital twin dynamic model system 15508 updates one or more KPI values of the manufacturing facility digital twins, machine digital twins, machine part digital twins, and all other embedded digital twins based on the one or more outputs of the dynamic model(s).

With the proliferation of vibration sensors and other Industrial Internet of Things (IIoT) sensors, there are vast amounts of data available relating to industrial environments. This data is useful in predicting the need for maintenance and for classifying potential issues in the industrial environments. There are, however, many unexplored uses for vibration sensor data and other IIoT sensor data that can improve the operation and uptime of the industrial environments and provide industrial entities with agility in responding to problems before the problems become catastrophic.

Industrial enterprises that rely on industrial experts struggle to capture the knowledge of these experts when they move on to another enterprise or leave the workforce. There exists a need in the art to capture industrial expertise and to use the captured industrial expertise in guiding newer workers or mobile electronic industrial entities to perform industrial-related tasks.

A knowledge distribution process and related technologies now will be described more fully hereinafter with reference to the accompanying drawings, in which illustrative embodiments are shown. The knowledge distribution process and technologies may, however, be embodied in many different forms and should not be construed as limited to the embodiments set forth herein; rather, these embodiments are provided so that this disclosure will be thorough and complete, and will fully convey the scope of the disclosure and inventions to those skilled in the art. The knowledge distribution process may use a knowledge distribution platform or system that utilizes blockchain technology for storing digital knowledge and providing convenient and secure control of the digital knowledge.

Where digital knowledge may be cryptographically secured, there can be a number of practical obstacles to the sharing of knowledge, such as the absence of trust between parties that could potentially benefit from sharing of the knowledge. For example, a manufacturer might benefit from having a supplier access trade secrets of the manufacturer in order to make components or materials on behalf of the manufacturer, but sharing the trade secrets creates a risk that the supplier may use the trade secrets on its own behalf or on behalf of competitors. Similarly, an engineer may be willing to share valuable code or instruction sets with others but be fearful of the misuse of that code. A need exists for a digital knowledge distribution system that facilitates orchestration of the sharing of knowledge by providing a high degree of control over the extent to which counterparties can access shared knowledge.

Even where knowledge is secure and well-controlled, some types of knowledge are so sensitive that an owner may be unwilling to share the entire set of knowledge with a single counterparty. For example, a proprietary process may be divided among different suppliers in order to keep any one supplier from deducing or reverse engineering the entire process. However, dividing knowledge presents operational challenges, as the owner may orchestrate a series of secure interactions with all involved parties in order to assure that the full set of knowledge may be maintained and accurately implemented. A need exists for a digital knowledge distribution system that facilitates handling and control of subsets of knowledge, including automated handling of aggregation of knowledge, or related outputs, that result from division of knowledge subsets.

Referring to FIG. 168, a knowledge distribution system 16802 is configured to facilitate management of digital knowledge 16804 by one or more users via a distributed ledger 16808. The digital knowledge 16804 may include any suitable knowledge that is conveyable from one party to another, such as in a digital format. Users and/or parties may include one or more knowledge providers 16806 and/or one or more knowledge recipients 16818. The knowledge providers 16806 are parties that provide knowledge to be managed via the knowledge distribution system 16802, such as by uploading one or more instances of the digital knowledge 16804 to the knowledge distribution system 16802 and/or the distributed ledger 16808. Uploading one or more instances of the digital knowledge 16804 and/or hosting one or more instances of the digital knowledge 16804 on the distributed ledger 16808 may include uploading an instance of the digital knowledge 16804 itself to the distributed ledger 16808 (e.g., which may be tokenized, contained in the smart contract, and/or stored in an associated database) and/or providing a reference to an accessible location of the instance of the digital knowledge 16804 and any other information required to retrieve the digital knowledge from the accessible location. When reference is made to receiving digital knowledge 16804, the digital knowledge 16804 itself or a reference thereto may be received. The term knowledge recipients 16818 may refer to parties that receive knowledge from the knowledge providers 16806 via the knowledge distribution system 16802 (including via reference or link to digital knowledge 16804) and/or via a distributed ledger 16808 that stores digital knowledge 16804. In some embodiments, the knowledge distribution system 16802 may facilitate management of digital knowledge 16804 by facilitating establishment of a chain of work, possession, and/or title of one or more instances of digital knowledge, such as by serving as a log of ownership of an instance of knowledge. The log of ownership may include a chain of log entries including an indication of a set of owners and/or contributors. For example, in some embodiments the knowledge distribution system 16802 may facilitate establishment of a chain of work, a chain of possession, and/or a chain of title corresponding to a 3D-printing instruction set for 3D printing an object (e.g., a custom-designed part, a replacement part, a toy, a medical device, a tool, or the like). In some embodiments, the knowledge distribution system 16802 may facilitate establishment of a seller database where the schematic may be stored prior to one or more of sale, transfer of the schematic to a buyer database, entry of a serial number of the custom part into a clause of a smart contract 16840, and printing of the custom part by a 3D printer owned by a buyer.

In some embodiments the knowledge distribution system 16802 may facilitate management of digital knowledge 16804 by managing aggregation of instances of digital knowledge 16804, such as where component instances of digital knowledge 16804 are aggregated to form larger instances of digital knowledge (e.g., where chapter instances are concatenated to form book instances, where component instances are linked schematically to form a system, where element instances are linked diagrammatically to generate a workflow, where partial instances are coupled to form a whole instance (e.g., the necessary parts of a formula), where related instances are topically linked to form a cluster, and via many other forms of aggregation).

In some embodiments, the knowledge distribution system 16802 may facilitate management of digital knowledge 16804 by facilitating verification of one or more sources of the digital knowledge and/or providing a chain of origination for a digital or physical item by virtue of related knowledge. For example, in embodiments, the knowledge distribution system 16802 may log a digital signature of a steel manufacturer in a distributed ledger that certifies a quality grade of steel provided by the steel manufacturer to a factory owner and may link the digital signature to serial numbers of each part produced by a factory owned by the factory owner that used the steel provided by the steel manufacturer.

In some embodiments, the knowledge distribution system 16802 may facilitate control of digital knowledge 16804 by facilitating collaboration of a plurality of knowledge providers 16806 such that information related to one or more instances of digital knowledge from one or more of disparate parties, disparate knowledge providers 16806, and disparate distributed ledgers 16808 may be tracked and/or combined into one or more consolidated distributed ledgers.

In some embodiments, instances of the digital knowledge 16804 may include, for example, instruction sets such as process steps and other methodologies in food production, transportation, executable algorithmic logic such as computer programs, a firmware program, an instructions set for a field-programmable gate array (FPGA), serverless code logic, a crystal fabrication system/process, a polymer production process, a chemical synthesis process, a biological production process, part schematics, and/or production records (e.g., production records of aircraft parts, spaceship parts, nuclear engine parts, etc.), a process and/or instruction set for semiconductor fabrication such as silicon etching and/or doping, an instruction set for a 3D printer such as for printing a medical device, an automobile part, an airplane part, a piece of furniture or component thereof, a replacement part for an industrial robot or machine, algorithmic logic such as an instruction set for use in an application, AI logic and/or definitions, machine learning logic and/or definitions, cryptography logic, serverless code logic, trade secrets and/or other intellectual property such as know-how, patented material, and works of authorship, food preparation instructions (e.g., for industrial food preparation), coating process instructions, biological production process instructions, chemical synthesis instructions, polymer production instructions, smart contract instructions, data sets and/or sensor information defining and/or populating a set of digital twins (such as digital twins that embody digital knowledge about one or more physical entities, including knowledge about configurations, operating modes, instruction sets, capabilities, defects, performance parameters, and many others), and/or any other suitable type of digitally transmittable knowledge. In these embodiments, the instruction sets may be consumed/leveraged by a computing device, a special purpose device, or a combination of devices (e.g., factory equipment). In some embodiments, instances of the digital knowledge 16804 may include personal and/or professional knowledge relating to one or more organizations and/or individuals, such as a professional resume and/or professional history tracking information. In some embodiments, the personal and/or professional knowledge may include one or more records of professional credentials such as academic degrees and/or certificates. In some embodiments, the personal and/or professional knowledge may include one or more verifications of professional positions held by the one or more individuals. In some embodiments, the personal and/or professional knowledge may include professional feedback for and/or verification of work performed for and/or by one or more third parties. The personal and/or professional knowledge may include personal and/or business financial history, personal life achievements as verified by one or more third parties. The knowledge provider 16806 may be any party that at least partially provides one or more instances of the digital knowledge 16804, such as a manufacturer, a seller, a customer, a wholesaler, a user, a manager, a notary, a factory owner, a maintenance worker, or any other suitable provider of the digital knowledge 16804.

In embodiments, the distributed ledger 16808 may be any suitable type of electronic ledger 16808, such as a blockchain (e.g., Hyperledger, Solidity, Ethereum, and the like). The distributed ledger 16808 may be centralized, decentralized, or a hybrid configuration where the knowledge distribution system 16802 stores a copy of a distributed ledger 16808 in addition to any number of participant nodes 16916 that store copies of the distributed ledger 16808. When referring to the distributed ledger 16808, the term "distributed ledger" (and/or any logs, records, smart contracts, blocks, tokens, and/or data stored thereon) may refer to a specific instance of a copy of the distributed ledger 16808 (and/or any logs, records, smart contracts, blocks, tokens, and/or data stored thereon) and/or the collection of local copies of the distributed ledger 16808-L stored across any number of nodes (which may include the knowledge distribution system 16802), unless specifically indicated otherwise.

In some embodiments, a private network of authorized participants, such as one or more of the knowledge providers and/or nodes, may establish cryptography-based consensus on one or more items, such that the knowledge distribution system 16802 may provide security, transparency, auditability, immutability, and non-repudiation to transactions for digital knowledge. In some embodiments, a trusted authority (e.g., the knowledge distribution system 16802 or another suitable authority) may issue private key and public key pairs to each registered user of the knowledge distribution system 16802. The private key and public key pairs may be used to encrypt and decrypt data (e.g., messages, files, documents, etc.) and/or to perform operations with respect to the distributed ledger 16808. In some embodiments, the knowledge distribution system 16802 (or another trusted authority) may provide two or more levels of access to users. In some embodiments, the knowledge distribution system 16802 may define one or more classes of users, where each of the classes of users is granted a respective level of access. In some of these embodiments, the knowledge distribution system 16802 may issue one or more access keys to one or more classes of users, where the one or more access keys each correspond to a respective level of access, thereby providing users of different levels of access via their respective issued access keys. In embodiments, possession of certain access keys may be used to determine a level of access to the distributed ledger 16808. For example, in some embodiments, a first class of users may be granted full viewing access of a block, while a second class of users may be granted both viewing access of blocks and an ability to verify and/or certify one or more instances of digital knowledge contained within a block, and while a third class of users may be granted viewing access of blocks, an ability to verify and/or certify one or more instances of digital knowledge contained within a block, and an ability to modify the one or more instances of digital knowledge contained within the block. In some embodiments, a class of users may be verified as being a legitimate user of the distributed ledger 16808 in one or more roles and allowed related permissions with respect to the distributed ledger and content stored therein. A user may be verified, for example, as a bona fide knowledge provider 16806 that uses a knowledge provider device 16890, knowledge recipient 16818 that uses a knowledge recipient device 16894, and/or crowdsourcer 16836 that uses a crowdsourcer device 16892. There may be any number of each device 16890, 16892, 16894. As shown in FIG. 168, there is one knowledge provider device 16890, two crowdsourcer devices 16892, and one knowledge recipient device 16894. In other examples, as it is understood, there may be one, two, three, or more of any device type 16890, 16892, 16894, in any combination. In other examples, there may be one of each device type (e.g., one knowledge provider device 16890, one crowdsourcer device 16892, and one knowledge recipient device 16894). In other embodiments, these devices 16890, 16892, 16894 may be implemented as one or more computing devices and/or server devices (e.g., as part of a server farm).

In some embodiments, the knowledge distribution system 16802 may include a ledger management system 16910. In some embodiments, the ledger management system 16910 manages one or more distributed ledgers (also referred to as "ledgers"). In some embodiments, the ledger management system 16910 may instantiate a distributed ledger for a particular knowledge provider 16806 or group of knowledge providers 16806, such as by instantiating a distributed ledger 16808 that stores instances of digital knowledge 16804 provided by the knowledge provider 16806 or group of knowledge providers 16806. The knowledge distribution system 16802 may allow only the particular knowledge provider 16806 or particular group of knowledge providers 16806 to host instances of digital knowledge 16804 (e.g., by using knowledge provider device 16890) on the related distributed ledger 16808 and/or for each instance of digital knowledge 16804, such that each distributed ledger 16808 is specific to a respective knowledge provider 16806 and/or an instance of digital knowledge 16804. In some embodiments, the ledger management system 16910 may instantiate a plurality of distributed ledgers 16808, one or more of the distributed ledgers 16808 being configured to facilitate hosting, sharing, buying, selling, licensing, or otherwise managing a category of digital knowledge 16804. Categories of digital knowledge may be related to, for example, one or more industries such as automotive and/or financial, or one or more types of digital knowledge, such as 3D printing schematics. In some embodiments, the ledger management system 16910 may maintain a distributed ledger that facilitates management of some or all of the instances of digital knowledge 16808 and/or the knowledge providers 16806 for which related data is stored by the knowledge distribution system 16802.

In some embodiments, a distributed ledger 16808 is any suitable type of blockchain. Any other suitable types of distributed ledgers may be used, however, without departing from the scope of the disclosure. The distributed ledger may be public or private. In embodiments, where the distributed ledger is private, reading from the ledger and/or validation privileges by a user such as the knowledge provider 16806 (e.g., using knowledge provider device 16890) may be restricted to invitees, users with one or more accounts/passwords, or by any other suitable method of restricting access to the distributed ledger 16808. In some embodiments, the distributed ledger 16808 may be at least partially centralized, such that a plurality of nodes of the distributed ledger is stored by the knowledge distribution system 16802. In some embodiments, the distributed ledgers are federated distributed ledgers, as the distributed ledgers may be stored on pre-selected or pre-approved nodes that are associated with the parties to a management of digital knowledge 16804 via the knowledge distribution system 16802. The techniques described herein may be applied, however, to publicly distributed ledgers as well. In a publicly distributed ledger, any suitably configured computing device (personal computers, user devices, servers) or set of devices (e.g., a server farm) may act as a node 16916 and may store a local copy of a distributed ledger 16808-L, whether the owner of the node otherwise participates in the transactions facilitated by the knowledge distribution system 16802. In these embodiments, such nodes 16916 may add validate/deny new blocks, save new blocks to the distributed ledger 16808 (if validated) to maintain a full copy (or nearly full copy) of the transaction history relating to the distributed ledger 16808, and broadcast the transaction history to other participating nodes 16916.

In some embodiments, the ledger management system 16910 (and/or the collection of participant nodes 16916) may be configured to leverage a distributed ledger 16808 to create an immutable log establishing of a chain of work, possession, and/or title of one or more instances of digital knowledge 16804, establishing verification or one or more sources of the digital knowledge 16804, and/or facilitating collaboration of a plurality of knowledge providers 16806. In some embodiments, the ledger management system 16804 establishing verification of 16810 may utilize a distributed ledger to manage a set of permission keys that provide access to one or more instances of the digital knowledge 16804 and/or services associated with the knowledge distribution system 16802. In some embodiments, the distributed ledger 16808 provides provable access to the digital knowledge 16804, such as by one or more cryptographic proofs and/or techniques. In some embodiments, the distributed ledger 16808 may provide provable access to the digital knowledge 16804 by one or more zero-knowledge proof techniques. In some embodiments, the ledger management system 16910 may manage the distributed ledger to facilitate cooperation and/or collaboration between two or more knowledge providers 16806 with regard to one or more instances of digital knowledge 16804.

FIG. 169 illustrates an exemplary embodiment of the distributed ledger 16808, the distributed ledger 16808 being distributed over a ledger network 16970. The ledger network 16970 may include the distributed ledger 16808 and a set of node computing devices 16916-1, 1691602, 1691603, 16916-N that communicate via one or more communication networks 16814. In some embodiments, the communication network 16814 may include the Internet, private networks, cellular networks, and/or the like. In embodiments, the nodes 16916 may all host a copy of the distributed ledger 16808 (or a portion thereof). For example, the ledger network 16970 may include a first node 16916-1, a second node 16916-2, a third node 16916-3 . . . and an Nth node 16916-N that communicate with the knowledge distribution system 16802 and with other nodes 16916 in the ledger network 16970. In some embodiments, the knowledge distribution system 16802 is configured to execute the ledger management system 16910 and may store and manage a local copy of a distributed ledger 16808 that is used in connection with facilitating management of one or more instances of the digital knowledge 16804 via the knowledge distribution system 16802. In some embodiments, the knowledge distribution system 16802 (or the ledger management system 16910 executed thereon) may also be thought of and referred to as a node of the ledger network 16970. In some embodiments, the ledger management system 16910 may also generate and assign private key and public key pairs to users such as one or more of the knowledge providers 16806 and/or one or more knowledge recipients 16818 of the digital knowledge 16804 (also referred to as "knowledge recipients") and/or to each node 16916 in the ledger network 16970, such that the private key and public key pairs are used to encrypt data transmitted between nodes 16916 in the ledger network 16970.

In some embodiments, each of the nodes 16916 of the ledger network 16970 (other than the knowledge distribution system 16802) may be a computing device or a set of connected computing devices that are associated with the knowledge providers 16806 and/or knowledge recipients 16818. In some embodiments, the nodes 16916 may include computing devices of parties that are not involved in the providing or receipt of knowledge (e.g., parties that are associated with neither the knowledge providers 16806 nor any of the knowledge recipients 16818). In some embodiments, each of the nodes 16916 may store a respective local copy 16808-L of the distributed ledger 16808. In some embodiments, one or more nodes may store a partial copy of the distributed ledger 16808. In some embodiments, each of the nodes 16916, 16916-1, 16916-2, 16916-3, 16916-N may execute a respective agent 16920, 16920-1, 16920-2, 16920-3, 16920-N. An agent 16920 may be configured to perform one or more of managing the local copy 16808-L of the distributed ledger 16808 associated with the node 16916 that executed the agent 16920, helping verify blocks that were previously stored on the distributed ledger 16808, helping verify requests from other nodes 16916 to store new blocks on the distributed ledger 16808, requesting permission to perform operations relating to the digital knowledge or management thereof on behalf of a user associated with the node 16916 on which the agent resides, and/or facilitating collaboration between one or more of the knowledge providers 16806 and/or one or more of the knowledge recipients 16818 (e.g., using knowledge provider device(s) 16890 and/or knowledge recipient device(s) 16894, respectively), such as by assisting with validation and/or transfer of one or more instances of the digital knowledge 16804 and/or executing one or more clauses of one or more smart contracts 16840. It is understood that nodes may perform additional or alternative tasks without departing from the scope of the disclosure.

In some embodiments, a knowledge recipient 16818 may receive one or more instances of digital knowledge 16804 via the knowledge distribution system 16802 via one or more knowledge recipient devices 16894. In embodiments, a knowledge recipient device 16894 may be any device that is configured to receive and/or use the digital knowledge 16804 from the distributed ledger 16808, such as a computing device, and/or may be devices for using the digital knowledge 16804, such as a 3D printer, a manufacturing device or system, and the like. In some scenarios, knowledge recipient 16818 may employ a plurality of knowledge recipient devices 16894, such as a server or computing device configured to download one or more instances of digital knowledge 16804 from the distributed ledger 16808 and transmit the one or more instances of digital knowledge to a 3D printer, a factory machine, a manufacturing system, or some other suitable device for using the one or more instances of the digital knowledge 16804. For example, a knowledge provider 16806 may upload a link (e.g., using a knowledge provider device 16890) of a computer-aided design (CAD) file of a 3D printable airplane part to the distributed ledger 16808. In embodiments, the knowledge provider 16806 may use e.g., the knowledge provider device 16890 to define or otherwise provide a smart contract that governs the use of the digital knowledge (e.g., the design file for the airplane part), including a cost of a use of the CAD file of the airplane part. A knowledge recipient 16818 may transfer funds (e.g., using knowledge recipient device 16894) to the knowledge provider 16806 (e.g., knowledge provider device 16890) (e.g., via the smart contract) in exchange for access to the CAD file via the distributed ledger 16808. A knowledge recipient device 16894 may then download the CAD file, which may then be used to 3D print the part. For example, the knowledge recipient device 16894 may be a business computer in communication with a 3D printer or a smart 3D printer itself. In the former scenario, the business computer may transfer the CAD file to the 3D printer. Upon receiving the CAD file, the 3D printer may 3D print the airplane part. In some embodiments, the digital knowledge itself (e.g., the CAD file) may be contained in the smart contract, such that the smart contract provides the digital knowledge to the knowledge recipient device 16894 upon verifying that the knowledge recipient 16818 has satisfied the conditions of release of the digital knowledge 16804 (e.g., deposited a requisite amount of currency). In some embodiments, each time that an instance of knowledge is used by a knowledge recipient 16818, a smart contract, the knowledge distribution system 16802, an agent 16920, and/or the knowledge recipient device 16894 may update the distributed ledger 16808 with a block indicating that the knowledge recipient used the instance of digital knowledge 16804.

In some embodiments, the knowledge distribution system 16802 may be configured to facilitate participation in management of digital knowledge 16804 by one or more crowdsourcers 16836, such as by allowing a crowdsourcer 16836 to verify one or more aspects of an instance of digital knowledge 16804 (e.g., using crowdsourcer device 16892). In embodiments, a crowdsourcer 16836 may be granted crowdsourcing permissions, thereby allowing the crowdsourcer 16836 to view/inspect the digital knowledge and to provide a verification vote 16926 and/or opinion. In embodiments, non-limiting examples of crowdsourcing permissions may include one or more of reviewing an instance of digital knowledge 16804, signing an instance of digital knowledge 16804, verifying an instance of digital knowledge 16804, and the like. Examples of crowdsourcers 16836 include certifying entities, domain experts, customers, manufacturers, wholesalers, and any other suitable party capable of verifying an instance of digital knowledge. In embodiments, certifying entities or domain experts may certify an instance of digital knowledge 16804 as being authentic, accurate, and/or reliable, and/or as coming from an authentic, accurate, and/or reliable source. In embodiments, customers may review an instance of digital knowledge 16804, such as to indicate that the digital knowledge 16804 is in working order and/or of expected quality. In embodiments, manufacturers and/or wholesalers may sign an instance of digital knowledge 16804, such as by applying a serial number to a piece of digital knowledge 16804 before the piece of digital knowledge is transmittable to a knowledge recipient 16818 (e.g., via knowledge recipient device 16894). Certifications, reviews, signatures, and/or any other validation indicia made by crowdsourcers 16836 may be recorded in the distributed ledger 16808, such as by adding one or more new blocks 16922 to the distributed ledger 16808 that indicate the certification, review, signature, or other validation indicia. In some embodiments, the new blocks 16922 may include data related to the certifications, reviews, signatures, and/or other validation indicia made by the one or more crowdsourcers 16836 (e.g., an identifier of the crowdsources, a timestamp, a location, and/or the like), e.g., using crowdsourcer devices 16892. In some examples, the knowledge distribution system 16802 may be paired with a crowdsourcing system (e.g., crowdsourcer devices 16892). Specifically, in examples, the crowdsourcing system (e.g., crowdsourcer devices 16892) may communicate with and engage with the smart contract 16840 such that upon crowdsourcing an element of the digital knowledge 16804 via the smart contract 16840, the digital knowledge 16804 may be embodied (e.g., recorded) in the distributed ledger 16808. The knowledge distribution system 16802 may use the smart contract 16840 to facilitate management of the digital knowledge 16804, such as by allowing the smart contract 16840 and crowdsourcers 16836 to verify (and/or contribute to) one or more aspects of an instance of digital knowledge 16804. For example, a software developer may provide a crowdsource request for a module or function in the smart contract 16840. This crowdsource request may be embedded in open source code as a request for a code element (e.g., where a first supplier of working code may get a share of proceeds (or a credit, or a token, etc.)) of a product. For this example, crowdsourcers 16836 may use the crowdsourcing system (e.g., crowdsource devices 16892) to respond to the crowdsource request by viewing/inspecting the digital knowledge (e.g., open source code) and may provide collaboration in the form of verifications, opinions, corrections, and/or contributions to the open source code which may relate to improvements to the open source code (e.g., improve accuracy and/or reliability of software). These verifications, opinions, corrections, and/or contributions indicia provided by the crowdsourcers 16836 may be recorded in the distributed ledger 16808 by adding one or more new blocks 16922 to the distributed ledger 16808 that indicate the indicia. The crowdsourcers 16836 may be compensated (e.g., via the smart contract 16840) based on their percentage of contribution to the open source code such that the original software developer may share the proceeds (or credits, or tokens, etc.) of the software product with the crowdsources. The percentage contribution may be based on the amount of code written and/or the impact of each crowdsourcer's contribution on the resulting open source code's functionality.

In some embodiments, the digital knowledge 16804 may be tokenized (e.g., at least partially converted to/wrapped in a knowledge token 17038). In embodiments, tokenizing the digital knowledge 16804 may include wrapping the digital knowledge into a knowledge token 17038 and/or wrapping access, licensing, ownership, and/or other suitable rights related to the digital knowledge 16804 such that the access, licensing, ownership and/or other suitable rights managed by one or more of the knowledge tokens 17038. By tokenizing digital knowledge 16804, the digital knowledge 16804 may reside in and be distributed via a distributed ledger 16808 and smart contracts 16840. In some embodiments, the knowledge distribution system 16802 may define permissions and/or operations associated with the knowledge tokens 17038. For example, the knowledge token 17038 may allow the tokenized digital knowledge 16804 to be viewed, edited, copied, bought, sold, and/or licensed based on permissions set at a time of tokenization by the knowledge distribution system 16802. In embodiments, the knowledge distribution system 16802 may provide for orchestration of a marketplace or exchange for digital knowledge 16804, such as where bodies or instances of digital knowledge 16804 may be exchanged, such as, without limitation, through sets of knowledge tokens 17038 that are optionally governed by smart contracts that may be configured by a host of a knowledge exchange or marketplace and/or by knowledge providers 16806 (e.g., using knowledge provider devices 16890) or knowledge recipients 16818 (e.g., using knowledge recipient devices 16894). For example, an exchange or marketplace may host exchanges for specific categories of know-how, expertise, instruction sets, trade secrets, insight, or other elements of knowledge described or referenced herein, where knowledge is categorized by subject matter of interest, where transaction terms are predefined and/or configurable (such as with configurable smart contracts that enable various transaction models, including bid/ask models, auction models, donation models, reverse auction models, fixed price models, variable price models, contingent pricing models and others), where metadata is collected and/or represented about categories of knowledge exchange, and where relevant content is presented, including market pricing data, substantive content about knowledge areas, content about providers, and the like. Such an exchange may facilitate monetization of tokenized knowledge represented in knowledge tokens 17038. In embodiments, a knowledge exchange, as described herein, may be integrated with or within another exchange, such as a domain-specific exchange, a geography-specific exchange, or the like, where the knowledge exchange may facilitate exchange of valuable or sensitive knowledge related to the subject matter of the other exchange. The other exchange may be a stock exchange, a commodities exchange, a derivatives exchange, a futures exchange, an advertising exchange, an energy exchange, a renewable energy credits exchange, a cryptocurrency exchange, a bonds exchange, a currency exchange, a precious metals exchange, a petroleum exchange, an exchange for goods, an exchange for services, or any of a wide variety of others. This may include integration by APIs, connectors, ports, brokers, and other interfaces, as well as integration by extraction, transformation, and loading (ETL) technologies, smart contracts, wrappers, containers, or other capabilities.

In some embodiments, the knowledge distribution system 16802 may be configured to create and issue one or more currency tokens associated with the distributed ledger 16808. The currency tokens may be digital objects such as cryptographic tokens, cryptographic currency, and the like, that may be purchased, mined, assigned, and/or distributed to users of the distributed ledger 16808. In some embodiments, the currency tokens may represent fiat currency (e.g., US Dollars, British Pounds, Euros, or the like), such that the value of the token is pegged to the fiat currency. In embodiments, the currency tokens may be used to transact digital knowledge. For example, in embodiments, smart contracts may be used to receive and verify that a knowledge recipient 16818 has paid the requisite amount of funds before releasing the digital knowledge 16804 to a knowledge recipient device 16894. Additionally or alternatively, knowledge recipients 16818 may use traditional payment methods (e.g., credit card payments) to transact for instances of knowledge. In some embodiments, the currency tokens may function as digital currency. For example, the currency tokens may be paid by knowledge recipients to knowledge providers in exchange for digital knowledge 16804 and/or paid to crowdsources (e.g., certifiers or experts) for verifying one or more aspects of digital knowledge 16804. In some embodiments, one or more users may be awarded currency tokens as a reward for discovering, or "mining," one or more new blocks 16922 of the distributed ledger 16808. In some embodiments, currency tokens may be asset-backed tokens, such as tokens backed by one or more other currencies (e.g., fiat currencies), securities, ownership rights of property, ownership rights of intellectual property, licensing rights of property and/or intellectual property, and the like. In some embodiments, the knowledge distribution system 16802 may be configured to track access rights and/or ownership rights of one or more of the currency tokens, such as by logging contents and/or balances of digital wallets of users. In some embodiments, the knowledge distribution system 16802 may be configured to issue a wallet passcode to a user, the wallet passcode being necessary to access, view, transfer, and otherwise manage the currency tokens owned (or at least partially owned) by the user to which the wallet passcode has been issued.

In some embodiments, the knowledge distribution system 16802 may include a smart contract system 16868 configured to generate smart contracts 16840 and deploy the smart contracts 16840 to the distributed ledger 16808. In embodiments, a smart contract 16840 may refer to a piece of software stored on the distributed ledger 16808 and configured to manage one or more rights associated with one or more instances of the digital knowledge 16804 and/or one or more knowledge tokens 17038. In embodiments, the smart contract may be a computer protocol that assists with negotiation and/or performance of terms in an agreement (e.g., distributed on blockchain such as Ethereum blockchain). The smart contract may be used in banking, government, management, supply chain, automobiles, real estate, health care, insurance, etc. In some embodiments, the smart contract 16840 may be contained and/or executed in a virtual machine or a container (e.g., a Docker container). In some embodiments, one or more of the nodes 16916 of the ledger network 16970 may provide an execution environment for the smart contract 16840. In embodiments, a smart contract 16840 may include information, data, and/or logic related to an instance of digital knowledge 16804, one or more triggering events, one or more smart contract actions to be executed in response to detection of one or more of the triggering events, and the like. In embodiments, the triggering events may define conditions that may be satisfied by events performable by one or more users, such as the knowledge provider 16806, the knowledge recipient 16818, and/or the crowdsourcer 16836, or by one or more third parties. Examples of the triggering events include payment of one party by another party, adherence, or lack of adherence to one or more terms of a sales, licensing, insurance, or other agreement made by one or more parties, meeting of one or more thresholds or ranges of properties of one or more pieces of the digital knowledge 16804, such as value, user rating, production amount, or any other suitable property, passage of time, or any other suitable triggering event. Additionally or alternatively, the triggering events defined in a smart contract 16840 may include conditions that may be satisfied independently of action or inaction of a human. For example, a triggering event may be when a certain date is reached, when a stock price reaches a certain threshold, when patent rights expire, when a copyright expires, when a natural event occurs (e.g., a hurricane, a tornado, a drought, or the like), etc. Triggering events may be defined as different types of triggers. For example, triggers or triggering events may refer to changing states (e.g., state change event) such as where the smart contract is active upon a set of data states (e.g., state change events). In other examples, triggers or triggering events may refer to events that occur such that users may need to passively wait for the events to occur and the knowledge distribution system 16802 may need to monitor for these events.

Referring to FIG. 170, the knowledge distribution system 16802 includes details of the smart contract 16840 and the smart contract system 17068. In embodiments, smart contract actions 17086 may include, for example, monitoring events from a defined data source, verifying fulfillment of obligations of one or more users and/or third parties according to one or more conditions 17084 defined in the smart contract 16840, verifying payment and/or transfer of tokens, property, other goods, or services, between one or more users and/or third parties, transferring the digital knowledge 16804 between parties or to one or more users, logging one or more transactions in the distributed ledger 16808, performing one or more operations with respect to the distributed ledger 16808, creating one or more new blocks 16922 in the distributed ledger 16808, and the like. In some embodiments, a smart contract 16840 may include an event listener 17080 that is configured to monitor one or more data sources (e.g., databases, data feeds, data lakes, public data sources, or the like) for detecting events to determine whether one or more conditions 17084 are met. For example, an event listener 17080 may listen to an application programming interface (API) that provides a connection between the knowledge distribution system 16802 and a printer, such that a smart contract may trigger an obligation of a user to make a payment when a printing instruction set governed by the knowledge distribution set (such as a tokenized instruction set in a knowledge token 17038) is used to print an item using the instruction set. Thus, when a predefined set of conditions 17084 is met, then a smart contract action 17086 may be triggered. This may include triggering a payment process (such as initiating an authorization of a payment on a credit card), closing out a contract (such as when a prepaid number of uses of a knowledge set has been reached), determining a price (such as by initiating a reference to current pricing data in a marketplace or exchange), reporting on an outcome (such as reporting a workflow or event), or the like. In response to being triggered, the smart contract may automatically execute the smart contract action 17086. In some embodiments, the smart contracts are Ethereum smart contracts and may be defined in accordance with the Ethereum specification, which may be accessed at https://github.com/ethereum, the contents of which are incorporated by reference. In other embodiments, the smart contract system 17068 may include the event listener 17080.

In some embodiments, the smart contract 16840 may be configured to "wrap" one or more instances of the digital knowledge 16804 in a smart contract wrapper (e.g., a "smart wrapper"). Once wrapped, an instance of digital knowledge may be handled and/or accessed differently than when unwrapped, such as by only being readable, editable, and/or transferrable according to terms, conditions, and/or operations of the smart contract 16840. The smart contract 16840 may wrap the digital knowledge 16804 such that in order to be accessed by the knowledge recipient 16818, the digital knowledge 16804 must first be "unwrapped," (e.g., reverted to a pre-wrapped form). In some embodiments, the pre-wrapped form may be the tokenized form. The smart contract 16840, the distributed ledger 16808, and/or the knowledge distribution system 16802 may unwrap one or more tokens and/or instances of the digital knowledge 16804 in response to one or more triggering events. In some embodiments, the knowledge distribution system 16802, or another suitable system, may store a plurality of smart contract templates from which the smart contract 16840 may be generated. In some embodiments, the smart contract system 17068 may include a smart contract (SC) generator 17082 that may parameterize at least one smart contract template (from the plurality of smart contract templates) based on the information provided by a user and any conditions 17084 and/or actions 17086 defined by the user. For example, the smart contract template may correspond to a type of digital knowledge that is to be tokenized. The contract template may include parameters based on the type of the digital knowledge. These parameters may include: financial parameters for use of the tokenized digital knowledge (e.g., financial parameters), royalty rate parameters for intellectual property (e.g., royalty parameters), number of times an instruction set can be used parameters (e.g., usage parameters), output amount parameters that may be produced using an instruction set (e.g., output produced parameters), allocation of consideration among parties parameters to the smart contract and designated beneficiaries of the smart contract (e.g., allocation of consideration parameters), identity parameters that may have permission to access the distributed ledger 16808 and/or the digital knowledge (e.g., identity parameters), and/or access condition parameters for the distributed ledger 16808 and/or the digital knowledge (e.g., access condition parameters). In some embodiments, the smart contract 16840 may be configured to manage a wrapped token based on an aggregated set of instructions defined in the smart contract 16840.

In some embodiments, the distributed ledger 16808 may store smart contracts 16840 configured to facilitate licensing of one or more intellectual property rights corresponding to an instance of digital knowledge, such as know-how, patented material, trademarks, works of authorship (e.g., copyrights), and/or trade secrets. In embodiments, the knowledge distribution system 16802 may be configured to allow one or more of the knowledge providers 16806 to engage in a licensing agreement with one or more of the knowledge recipients 16818 via a smart contract 16840 (e.g., using one or more knowledge provider devices 16890 and/or one or more knowledge recipient devices 16894). In embodiments, a smart contract 16840 may be configured to embed licensing terms for the intellectual property in one or more of the blocks 16922 of the distributed ledger 16808, including scopes of use, waivers, indemnifications, limitations of use, geographical limitations, and/or the like. In embodiments, one or more copies of and/or references to the one or more pieces of intellectual property may be stored on the distributed ledger 16808, and access to the one or more pieces of intellectual property may be governed by terms of the smart contract 16840. Upon execution of the smart contract 16840, the knowledge distribution system 16802 may automatically transfer access and licensing rights to the intellectual property to the knowledge recipient 16818 (e.g., knowledge recipient device 16894 of knowledge recipient 16818) according to terms and/or operations set forth in the smart contract 16840. In some embodiments, the knowledge distribution system may be configured to verify assignee rights with resources such as public patent assignee logs prior to transferring access and/or licensing rights. In embodiments, the smart contract 16840 may contain one or more operations to be performed with respect to the distributed ledger 16808 to facilitate an execution defined by the smart contract 16840. In some embodiments, the smart contract 16840 may be configured to automatically allocate royalties in transfers between one or more knowledge providers 16806 and knowledge recipients 16818 (e.g., using knowledge provider devices 16890 and knowledge recipient devices 16894) involving transfer of access to, ownership of, and/or licensing rights to intellectual property. For example, if the owner of the digital knowledge pays licensing fees to a third-party patent owner of one or more aspects of the digital knowledge (e.g., the inventor of a particular product design), the smart contract may allocate a set percentage or amount of the transaction price of the digital knowledge 16804 to the licensor, such that the license to make, sell, use, and/or otherwise transact for is transferred to the recipient of the digital knowledge 16804. In embodiments, the operations for allocating royalties may be performed according to one or more terms of one or more of the smart contracts 16840 and may have related smart contract actions 17086.

In some embodiments, the knowledge distribution system 16802 may be configured to aggregate intellectual property licensing terms. The distributed ledger 16808 may be configured to store an aggregate stack of instances of the digital knowledge 16804, where one or more aspects of the digital knowledge 16804 are restricted in accordance with an intellectual property right of a party (e.g., a patent, copyright, trademark, or trade secret of the knowledge provider or any other party). In embodiments, the ledger management system 16910 may facilitate adding one or more instances of the intellectual property to the aggregate stack, thereby associating the added instance of intellectual property to the stack of intellectual property to which the instance of intellectual property is added. Operations such as transfer of control, edit, viewing, ownership, and/or licensing rights may be performed on an entire stack of intellectual property by the knowledge distribution system 16802, such as according to terms of one or more smart contracts 16840. Access to, ownership of, and/or sublicensing rights to the aggregate stack of intellectual property may be transferred from one or more of the knowledge providers 16806 to one or more of the knowledge recipients 16818 via the knowledge distribution system 16802 (e.g., using knowledge provider devices 16890 and knowledge recipient devices 16894). In some embodiments, a smart contract may be configured to transfer rights to the aggregate stack of intellectual property associated with an instance of digital knowledge (e.g., the right to use, sell, offer for sale, export, import, a product, or process associated with the intellectual property stack) or to transfer the intellectual property stack in its entirety to the digital knowledge recipient. In the latter scenario, the smart contract may be configured to facilitate the assignment of the intellectual property stack to the digital knowledge recipient (e.g., populating assignment forms that are submitted to patent, trademark, or copyright offices of one or more jurisdictions and to electronically file the assignment documents). In some embodiments, the assignment of intellectual property rights may be recorded in the distributed ledger 16808 as well.

In some embodiments, the ledger management system 16910 may define one or more operations that may handle or process commitments of one or more parties to the smart contract 16840 and/or terms thereof. When a set of parties (e.g., knowledge providers 16806, knowledge recipients 16818, crowdsourcers 16836 and/or third parties) commit to the terms of a smart contract 16840 to a term of a smart contract governing the transfer of digital knowledge 16804, the knowledge distribution system 16802 (and/or the smart contract 16840 itself) may handle or process commitments of the parties and/or identifiers of the parties to one or more portions (e.g., terms) of the smart contracts 16840. In embodiments, upon a set of parties committing to a smart contract 16840, the smart contract 16840 and/or the knowledge distribution system 16802 may link one or more of the parties to one or more of the triggering events defined in the smart contract 16840, begin monitoring one or more data sources to determine whether any conditions 17084 defined trigger events are met, and/or automatically perform operations/actions defined in the smart contract (e.g., in response to the occurrence of a triggering event). For example, a knowledge provider 16806 may upload a smart contract 16840 (e.g., using knowledge provider device 16890) to the distributed ledger 16808 and/or customize a smart contract 16840 using a smart contract template in connection with uploading an instance of the digital knowledge 16804. In embodiments, the knowledge provider 16806, a knowledge recipient 16818, or some other party may indicate (e.g., via the knowledge distribution system 16802, the distributed ledger 16808, and/or the smart contract 16840) terms of an agreement between the knowledge provider 16806 and the knowledge recipient 16818 upon an agreement being formed between the knowledge provider 16806 and the knowledge recipient 16818. In some embodiments, the smart contract 16840 may include one or more rights, terms, and/or obligations provided by the knowledge provider 16806 and/or a third party prior to identification of and/or dealing with the knowledge recipient 16818. The knowledge recipient 16818 may agree to be bound by rights, terms, and/or obligations defined via the smart contract 16840 upon agreeing to receive the digital knowledge 16804 (e.g., using knowledge recipient device 16894). The knowledge recipient 16818 may be a user who is willing to transact (e.g., buy, license, or otherwise make a deal with the knowledge provider 16806) for the digital knowledge 16804. The smart contract 16840 may commit or otherwise bind (or process commitments) the knowledge provider 16806, the knowledge recipient 16818, and/or other parties to the agreement to terms and/or conditions 17084 of the smart contract 16840 in response to receiving indication via the knowledge distribution system 16802 and/or the distributed ledger 16808.

In some embodiments, the knowledge distribution system 16802 may include an account management system. In embodiments, the account management system 16846 may facilitate creation and/or storage of user accounts related to users of the knowledge distribution system 16802, the knowledge distribution system 16802, and/or the distributed ledger 16808. For example, the account management system 16846 may be configured to facilitate registration of one or more of the knowledge providers 16806, the knowledge recipients 16818, the crowdsourcers 16836, and/or other third parties that may be associated with the knowledge distribution system 16802, the knowledge distribution system 16802, and/or the distributed ledger 16808. In some embodiments, the account management system 16846 may be configured to, together with the ledger management system 16910, facilitate intake of data from registered users of the distributed ledger 16808, such as name, address, company affiliation, financial account information (e.g., bank account numbers and/or routing numbers), digital identifiers (e.g., IP addresses, MAC addresses, and the like), and any other suitable information related to the registered users.

The account management system 16846 may update the user account of the registered user with data taken in and related to the registered user. In some embodiments, the account management system may facilitate generation and/or distribution of one or more of the permission keys 16932 to one or more of the registered users. The permission keys 16932, 16932-1, 16932-2, 16932-3, 16932-N may provide the registered user with access to one or more instances of the digital knowledge 16804 and/or services associated with the knowledge distribution system 16802.

In some embodiments, the knowledge distribution system 16802 may include a user interface system 16850 configured to present a user interface. The user interface may be configured to facilitate uploading of digital knowledge 16804, generation and/or uploading of a smart contract 16840, and viewing of the digital knowledge 16804 and/or the smart contract 16840 (and statuses thereof). The user interface may be a graphical user interface. Information presented to users of the knowledge distribution system 16802 via the user interface may include descriptions of one or more instances of the digital knowledge 16804, ownership and/or licensing information related to the one or more instances of the digital knowledge 16804, information related to the user viewing the user interface and/or other users of the knowledge distribution system 16802, price information related to one or more instances of the digital knowledge 16804, statistics and/or metrics related to the distributed ledger 16808 and/or contents thereof, such as node count, payouts for generation of additional nodes, and any other suitable information. In some embodiments, users may view contents of their digital wallets via the user interface, such as a balance of one or more types of currency tokens.

In some embodiments, the user interface may be configured to allow one or more users to perform one or more of the operations related to the digital knowledge 16804 and/or the distributed ledger 16808, such as buying, selling, verifying, and/or reviewing the digital knowledge 16804 and/or performing other operations related to the distributed ledger 16808 discussed herein. For example, the knowledge provider 16806 may select a computer file (such as a 3D printer schematic file) to upload to the distributed ledger 16808 via the user interface (e.g., using knowledge provider device 16890). The user interface may present the knowledge provider 16806 with one or more options related to uploading the digital knowledge 16804, such as an ability to configure a smart contract 16840 and related terms for wrapping and/or tokenizing the digital knowledge 16804. Other options may include privacy options, such as options pertaining to one or more users or classes of users who may and/or may not view, buy, sell, license, rate, verify, review, or otherwise manage or interact with the digital knowledge 16804.

In some embodiments, the user interface system 16850 may include a marketplace system 16854 configured to establish and maintain a digital marketplace 16856. In embodiments, the digital marketplace 16856 provides an environment that allows knowledge providers and potential recipients to engage in commerce relating to the transfer of digital knowledge 16804. For example, the digital marketplace may be configured to allow one or more users and/or third parties to search for one or more pieces of digital knowledge 16804 similar to a digital storefront, transact for one or more pieces of the digital knowledge 16804 (e.g., buy, sell, license, lease, bid on, and/or give away the digital knowledge), receive recommendations for digital knowledge 16804, review one or more pieces of the digital knowledge 16804, verify source information and/or other information related to one or more pieces of the digital knowledge 16804, transact for one or more pieces of the digital knowledge 16804 (e.g., buy, license, bid on one or more pieces of the digital knowledge, or the like), and/or perform any other suitable marketplace interaction with the digital knowledge 16804, one or more of the knowledge providers 16806, the distributed ledger 16808, one or more of the knowledge recipients 16818, one or more crowdsourcers 16836, or any other user or third party. In some embodiments, the digital marketplace 16856 may be configured to allow users to edit user accounts associated with themselves and view user accounts associated with other users. In some embodiments, the digital marketplace 16856 user interface may allow users to make reviews and/or ratings of other users.

In embodiments, the knowledge distribution system 16802 may include one or more datastores 16858. FIG. 171 illustrates an example set of datastores 16858 of the knowledge distribution system 16802. In some embodiments, the knowledge distribution system 16802 may include one or more datastores 16858 configured to store data related to the digital knowledge 16804, the distributed ledger 16808, the knowledge providers 16806, the knowledge recipients 16818, the crowdsourcers 16836, the knowledge tokens 17038, the smart contracts 16840, the account management system 16846, the marketplace system 16854, or any other suitable type of data. A datastore may store folders, files, documents, databases, data lakes, structured data, unstructured data, or any other suitable data.

In some embodiments, the datastores 16858 may include a knowledge datastore 17160 configured to store data. The knowledge datastore 17160 may be in communication with the user interface system 16850. The user interface system 16850 may be configured to populate the user interface with data stored in the knowledge datastore 17160. In some embodiments, data stored in the knowledge datastore 17160 may include knowledge related to the digital knowledge 16804 such as source, reviews, price, ownership, licensing, related knowledge providers 16806, related knowledge recipients 16818, serial numbers, related crowdsourcers 16836, or any other suitable information. For example, the knowledge datastore 17160 may contain information related to a 3D printer schematic such as origin, date of creation, names of one or more contributing individuals, groups, and/or companies, pricing, market trends for related schematics, serial numbers and/or part identifiers, and any other suitable type of data related to the 3D printer schematic.

In some embodiments, the datastores 16858 may include a client datastore 17162 (e.g., may include user datastore), the client datastore 17162 being configured to store data relating to users of the knowledge distribution system 16802. The client datastore 17162 may be in communication with the account management system 16846 and may be populated with user accounts related to one or more of the user accounts, data contained in one or more of the user accounts, data related to the one or more user accounts, and/or a combination thereof.

In some embodiments, as shown in FIGS. 170 and 171, the datastores 16858 may include a smart contract datastore 17164. In embodiments, the smart contract datastore 17064 is configured to store data related to one or more of the smart contracts 16840 and/or smart contract templates (from which smart contracts 16840 may be parameterized and instantiated). In embodiments, the smart contract datastore 17064 may be in communication with the ledger management system 16910. Data stored in the smart contract datastore may include, for example, smart contract templates, one or more smart contracts 16840, data related to instances of the digital knowledge 16804 related to one or more of the smart contracts 16840, data related to parties to one or more of the smart contracts 16840, and any other suitable data. The smart contract datastore 17064 may be configured to store completed smart contracts that have already been executed. The smart contract datastore 17064 may be configured to store smart contracts that have not yet been uploaded to the distributed ledger 16808.

Referring to FIG. 168, in some embodiments, the knowledge distribution system 16802 may include an analytics system 16866 configured to analyze one or more tokenized instances of the digital knowledge 16804, such as the knowledge token 17038, and report an analytic result. The analytics system may analyze the tokenized instance of the digital knowledge 16804 in order to determine one or more properties and/or metrics of the tokenized instance of the digital knowledge 16804. Properties of tokenized digital knowledge 16804 may include, for example, source, reviews, price, ownership, licensing, related knowledge providers 16806, related knowledge recipients 16818, serial numbers, related crowdsourcers 16836, or any other suitable information. The analytics system 16866 may be configured to determine one or more trends, metrics, and/or predictions related to the properties. In some embodiments, the analytics system 16866 may include a machine learning module configured to perform predictions and/or analyses of the properties related to the digital knowledge 16804 via one or more machine learning techniques.

In some embodiments, properties of tokenized intellectual property may be analyzed by the analytics system 16866. For example, the analytics system 16866 may be configured to analyze tokenized digital knowledge 16804 including intellectual property. Analyzed properties of tokenized intellectual property may include, for example, transaction history including changes and/or assignments in ownership and/or licensing rights of the intellectual property, litigation history including lawsuits involving the intellectual property and data related to the lawsuits, information pulled from one or more databases of intellectual property related to the intellectual property, and any other suitable property of the tokenized intellectual property or any other token or suitable instance of the digital knowledge 16804. Metrics related to tokenized intellectual property may include, for example, value, age, strength, efficacy, or any other suitable metric related to the tokenized intellectual property or any other knowledge token 17038 or suitable instance of the digital knowledge 16804.

In some embodiments, the knowledge distribution system 16802 may be configured to perform an aggregation operation that aggregates a set of operations and/or instructions included in one or more instances of the digital knowledge 16804. Aggregation may be employed where component instances of digital knowledge 16804 are aggregated to form larger instances of digital knowledge. In embodiments, aggregation occurs where component instances are concatenated to form larger instances, such as by adding component instances as additional (optionally tokenized) blocks to a chain, or by adding references or links to component knowledge blocks. Examples of concatenation aggregation include where chapter instances are concatenated to form book instances, where sentence instances are concatenated to form paragraphs, where word instances are concatenated to form sentence instances, and the like. In embodiments, aggregation occurs where component instances are linked schematically to form a system, such as where knowledge representing physical component parts of a machine are linked to form the machine, where component steps in a process are linked to form the complete process, or the like. In embodiments, aggregation of knowledge involves linking elements in a flow, such as where instances are linked diagrammatically to generate a workflow, such as where ingredients and process steps are linked to generate a recipe or formulation process, where workflow steps and materials are linked to describe a work process (such as one involving expertise or know how) or the like. In embodiments, aggregation of knowledge involves coupling of partial instances to form a whole instance, such as where two or more sub-parts of a formula are joined to form a complete formula (e.g., a chemical, pharmaceutical, biological, materials science, physical, or other formula), where two or more sub-parts of an instruction set (e.g., computer code) are joined to form the entire instruction set, or the like. In embodiments, aggregation may involve linking related instances of knowledge in a cluster, such as where instances of knowledge are topically linked to form a cluster, such as a cluster of related subjects in a knowledge domain (such as a scientific domain, a domain of the humanities, a social science domain, a commercial domain, a business domain, or many others). In embodiments, aggregation may involve hierarchical aggregation of knowledge, such as by representing knowledge according to one or more defined hierarchies, such as an organizational hierarchy (such as an organizational chart or reporting structure), an industry hierarchy, a topical hierarchy, a physical hierarchy, or the like. Many other examples of aggregation may be envisioned. The ledger management system 16910 may be configured to perform the aggregation operation. The aggregation operation adds at least one instruction to a preexisting set of instructions, thereby yielding a modified set of instructions. The modified set of instructions may then be stored in the distributed ledger 16808 and may be tokenized, manipulated, and/or managed similarly to any instance of the digital knowledge 16804. In some embodiments, the aggregation operation may be performed by the smart contract 16840, according to one or more terms of the smart contract 16840, and/or in reaction to triggering of one or more triggering events of the smart contract 16840. In some embodiments, the aggregation operation may be performed at request of a user of the knowledge distribution system 16802.

In some embodiments, the ledger network 16970 is a federated network, such that the ledger management system 16910 of the knowledge distribution system 16802 may act as an arbiter to simplify the consensus mechanism. Some or all of the nodes 16916 may be preselected or preapproved to act as nodes 16916 with respect to the management of blocks of the distributed ledger 16808 and/or data contained therein, such as one or more instances of the digital knowledge 16804. The ledger management system 16910 may ease computational burdens on the other nodes 16916 in the ledger network 16970. In some embodiments, the distributed ledger 16808 is distributed, such that the participating nodes 16916 may each store a respective local copy 16808-L of the distributed ledger 16808, where each local copy 16808-L may include the entire distributed ledger 16808 or a portion thereof.

In the illustrated example, the knowledge distribution system 16802 stores a copy of the distributed ledger 16808, the copy of the distributed ledger 16808 being local to the knowledge distribution system 16802, and each node 16916 stores a distributed local copy 16808-L of the distributed ledger 16808. In some embodiments, however, the knowledge distribution system 16802 does not store a local copy of the distributed ledger 16808 such that the distributed ledger 16808 is maintained wholly by participant nodes 16916. A distributed copy (e.g., copy 16808-L) of the distributed ledger 16808 may contain the entire distributed ledger 16808 or only a portion of the distributed ledger 16808. In general, each copy of the distributed ledger 16808 stores a set of blocks 16922. In some embodiments, each respective block may store information relating to a respective state change event as a hash value and may further store a block identifier of a "parent" block that was added to the distributed ledger 16808 prior to the respective block. In some embodiments, the ledger management system 16910 may select the block that was most recently added to the ledger to act as the parent block, whereby the ledger management system 16910 includes the block identifier of the most recently added block to the state change event record.

A state change event may refer to any change of state relating to the digital knowledge 16804 and/or management of one or more instances of the digital knowledge 16804. Non-exhaustive examples of state change events may include creating a new instance of the digital knowledge 16804, registering a new user of the knowledge distribution system 16802, such as a new knowledge provider 16806 (and/or registering a new knowledge provider device 16890) or a new knowledge recipient 16818 (and/or registering a new knowledge recipient device 16894), granting the new user permission to perform a specific operation, modifying certification and/or validation of one or more instances of the digital knowledge 16804 at the request of a user, transmitting one or more instances of the digital knowledge 16804 to one or more knowledge recipients 16816 (e.g., knowledge recipient devices 16894), recordation of a use of an instance of digital knowledge 16804 by a knowledge recipient, and the like. In some embodiments, the ledger management system 16910 may create a state change event record that indicates the state change event, e.g., the operation that was performed, for each state change event that occurs. A state change event record may further be information/metadata relating to the event, such as one or more user identifiers of one or more respective users associated with the state change event, a timestamp corresponding to the state change event, a device identifier of the device that requested or performed an operation, an IP address corresponding to the device that requested or performed the operation, and/or any other relevant data. In some embodiments, the ledger management system 16910 may include a block identifier of a previous block that was previously stored on the ledger 16808 in the state change event record, such that the previous block may be a "parent" to a new block that will be generated based on the state change event record, as the state change event record references the previously stored block, but the previously stored block will not reference the new block. In some embodiments, the block identifier may be the hash value of a previously generated block.

In some embodiments, the ledger management system 16910 and/or one or more of the nodes 16916 may be configured to generate a state change event record for each event occurring with respect to management of digital knowledge 16804 via the knowledge distribution system 16802. In embodiments, the ledger management system 16910 and/or one or more of the nodes 16916 may generate a new block 16922 corresponding to the state change event record by generating a cryptographic hash (or "hash value") of the state change event record by inputting the state change event record into a hashing function to obtain the cryptographic hash. The resultant hash value is a unique value (or substantially unique value with a very low likelihood of collisions) that represents the contents of the state change event record, such that the resultant hash value is a unique identifier that identifies the new block and that also encodes the contents thereof, including a block identifier of the parent block. Thus, when the new block is "solved" (solving a block in this context may refer to the process of determining the original contents of the state change event record encoded in the hash value), the solution of the new block indicates the contents of the state change event record, including the block identifier of the parent block. As such, the hash value of the preceding state change event record may be used to verify the authenticity of the current state change event record by way of verification. While the above description describes blocks that store only one state change event record, in some embodiments, the ledger management system 16910 and/or one or more of the nodes 16916 may encode two or more state change event records in a single block. The ledger management system 16910 and/or one or more of the nodes 16916 may include the two or more state change event records in the body of a new block data structure and may include the block identifier of the previous block in a block header of the new block data structure. The ledger management system 16910 and/or one or more of the nodes 16916 may then input the new block data structure into the hashing function, which outputs the new block 16922. In these embodiments, the new block 16922 may be a cryptographic hash that represents the two or more state change event records and the block identifier of the previous block (i.e., the parent block to the new block). In this way, when the new block is solved, the solution to the block is the two or more state change event records and the block identifier of the parent block, where the block identifier of the parent block can be used to validate the authenticity and accuracy of the new block.

In embodiments, the ledger management system 16910 and/or one or more of the nodes 16916 may request verification of a block 16922. In some embodiments, verification of a block 16922 may include broadcasting a request 16924 to verify a block 16922 (referred to as "the block 16922 to be verified") to the other nodes 16916 in the ledger network 16970 (which may include the ledger management system 16910 if the ledger management system 16910 is not issuing the request 16924). In some embodiments, the request 16924 may include or be broadcasted with the block 16922 to be verified. Verification may further include one of the other nodes 16916 that received the request 16924 (or potentially the ledger management system 16910) solving the block 16922 to be verified. A node 16916 may determine it has solved the block 16922, when the solution to the block contains a valid block identifier—that is, a block identifier that references one of the other blocks 16922 stored on the distributed ledger 16808. Once the solver has determined the solution to the block 16922, the solver broadcasts a "proof of work" 16928 to the other nodes 16916. In some embodiments, the proof of work 16928 may be the block identifier of the previous block 16922. In some embodiments, each of the non-solving nodes 16916 (potentially including the ledger management system 16910), may receive the proof of work and may validate the proof of work based on the copy of the distributed ledger 16808 that is stored at the node 16916. In these embodiments, each node 16916 may determine whether the block identifier contained in the proof of work corresponds to (e.g., matches) a block identifier of a block stored on the local copy of the distributed ledger 16808.

In some embodiments, the ledger management system 16910, in conjunction with the other nodes 16916 in the ledger network 16970, maintains an immutable record of any operations performed with respect to a management of digital knowledge 16804 via the knowledge distribution system 16802 using the knowledge distribution system 16802. In these embodiments, any time a user performs an operation with respect to management of digital knowledge 16804 via the knowledge distribution system 16802 hosted on the knowledge distribution system 16802, the ledger management system 16910 may: generate a new event state record corresponding to the operation; encode the new event state record into a new block data structure and a block identifier of a previous block (e.g., the most recently added block) into a block header of the new block data structure; and hash the new block data structure using a hashing function to obtain the new block. Furthermore, in some embodiments, the ledger management system 16910 may transmit a request 169240 to verify the new block 16922 to the other nodes 16912 in the network 16814. In some embodiments, one of the nodes 16916 may attempt to determine a solution to the new block 16922. If a valid solution is determined, the solver node 16916 may transmit a proof of work 16928 to the other nodes 16916 in the ledger network 16970, and the other nodes 16916 may attempt to validate the proof of work 16928.

In some embodiments, the ledger management system 16910 utilizes a distributed ledger 16808 to manage permissions of different users of the knowledge distribution system 16802, such as one or more of the knowledge providers 16806 (and/or one or more knowledge provider devices 16890) and/or one or more of the knowledge recipients 16818 (and/or one or more knowledge recipient devices 16894). In some embodiments, permissions may be granted with respect to an instance of the digital knowledge 16804 or set of instances of the digital knowledge 16804. For example, permissions may include permission for a user to upload an instance of the digital knowledge 16804 or set of instances of the digital knowledge 16804, permission for a user to view an instance of the digital knowledge 16804 or set of instances of the digital knowledge 16804, permission for a user to edit an instance of the digital knowledge 16804 or set of instances of the digital knowledge 16804, permission for a user to delete an instance of the digital knowledge 16804 or set of instances of the digital knowledge 16804, permission for a user to download an instance of the digital knowledge 16804 or set of instances of the digital knowledge 16804, permission for a user to print (e.g., print-to-paper or 3D print) an instance of the digital knowledge 16804 or set of instances of the digital knowledge 16804, and the like. Permissions may additionally or alternatively relate to services 16930 that are offered by the knowledge distribution system 16802. For example, permissions may include permission for a user to access a full-text search functionality on the knowledge distribution system 16802, permission for the user to use a virus scanner offered by the knowledge distribution system 16802, permission for the user to have the knowledge distribution system 16802 generate a machine-generated instance of the digital knowledge 16804 or set of instances of the digital knowledge 16804, and the like. Permissions may also include the permission to perform an operation granted to one or more other users. Permissions may be applied to one or more users by default, applied to one or more classes of users, such as users holding one or more of the permission keys 16932, automatically be applied to one or more categories of users such as knowledge provider 16806, knowledge recipient 16818, and/or crowdsourcer 16836, and/or may be manually given to one or more users by administrators and/or managers of the knowledge distribution system.

In some embodiments, the ledger management system 16910 may manage individual participant's access to respective services 16930 by generating one or more unique service-specific permission keys 16932 for a respective service 16930 and issuing each respective unique service-specific permission key 16932 to a respective participant that has been granted access to the respective service 16930. In some of these embodiments, the ledger management system 16910 may utilize the distributed ledger 16808 to store proof of the service-specific permission keys 16932 and to manage permissions to the services 16930. In these embodiments, the ledger management system 16910 may: receive an instruction to grant a user permission to access a particular service; generate a service-specific permission key 16932 corresponding to the particular service and assign the key 16932 to the user; encode a user ID of the user and the service-specific permission key 16932 in a state change event record; generate a new block based on the state change event record and a block identifier of a previously stored block; store the new block on its local copy of the distributed ledger 16808, and broadcast the new block to other nodes 16916 in the network for storage on the respective copies of the distributed ledger 16808 stored at the nodes. In some embodiments, the ledger management system 16910 may validate the new block prior to storing and transmitting the block for storage at the other nodes 16916. The ledger management system 16910 may further transmit the new block to a computing device associated with the user (which may or may not be a participating node), whereby an agent 16920 on the computing device may store the new block. In this way, the agent 16920 may use the new block to obtain access to the particular service, when the user attempts to access the particular service 16930 from the computing device. When the user attempts to access the particular service 16930, the agent may communicate the block containing the permission key 16932 corresponding to the particular service 16930 to the ledger management system 16910. The ledger management system 16910 may solve the received block and/or validate the received block, in the manner described above. If the ledger management system 16910 is able to validate the received block, the ledger management system 16910 grants the computing device of the user access to the service 16930, whereby the user may begin using the service 16930. In some embodiments, permissions and access to an instance of the digital knowledge 16804 or set of instances of the digital knowledge 16804 that are stored in an organizational structure may be managed in a similar way, where users are granted permission keys 16932, where these permission keys 16932 correspond to specific operations that a user may perform on the instance of the digital knowledge 16804 or set of instances of the digital knowledge 16804 with which the permission keys 16932 are associated.

In some embodiments, the ledger management system 16910 and/or one or more computing node computing devices 16916 having requisite processing resources may generate an immutable log of a transaction based on the distributed ledger 16808. In these embodiments, the ledger management system 16910 and/or the nodes 16916 (referred collectively as the solving nodes 16916) may begin solving the most recent blocks 16922 in the distributed ledger 16808. Each time a block is solved, the solving node 16916 may transmit the proof of work 16928 to other nodes 16916, which may then verify the accuracy of the solution. The solving nodes 16916 may iteratively solve each of the blocks 16922 in the distributed ledger 16808 in this manner until the entire distributed ledger 16808 is solved, thereby resulting in an operation log of the management of digital knowledge 16804 via the knowledge distribution system 16802. The operational log may define the actions or operations that were performed using the knowledge distribution system 16802. By creating, validating, and solving the blocks 16922 of the distributed ledger 16808 in the manners described above, the distributed ledger 16808 is generated in a transparent and secure manner. The resultant operational log is stored in an encrypted manner until it is solved, and once solved, the operational log is auditable and immutable. The operational log may indicate each time a user was allowed to access the distributed ledger 16808 and/or management of digital knowledge 16804 via the knowledge distribution system 16802, the permissions that each user was granted, the requests to perform operations or use services 16930 that each user initiated, the operations that were performed, the user that performed the operation, and the like.

In some embodiments, the solving nodes 16916 may optimize the solving of the ledger 16808 by solving different blocks 16922 in a distributed manner. For example, if the distributed ledger 16808 includes one or more forks (e.g., when more than one child block points 16922 to the same parent block 16922), the distributed ledger 16808 may be said to fork at the parent block 16922. In this example, each chain originating at the fork may have a final block 16922 (or leaf block 16922). In this scenario, different solving nodes 16916 may begin solving the ledger 16808 at different leaf blocks 16922 in a breadth-first or depth-first manner, thereby increasing the speed at which the ledger 16808 is solved.

In some embodiments, the ledger management system 16910 may be configured to facilitate collaboration between one or more of the knowledge providers 16806, one or more of the knowledge recipients 16818, or a combination thereof, by assisting in the execution of management of digital knowledge 16804 via the knowledge distribution system 16802 using, for example, smart contracts. In these embodiments, the ledger management system 16910 may provide management of digital knowledge 16804 via the knowledge distribution system 16802 that is defined to facilitate a respective type of management of digital knowledge 16804. For example, for a transfer of one or more instances of digital knowledge to a knowledge recipient 16818 (e.g., using knowledge recipient device 16894) in exchange for funds transmitted to a knowledge provider 16806 (e.g., knowledge provider device 16890) in accordance with a sale, license, or rental agreement and/or a smart contract, the ledger management system 16910 define various tasks that must be completed before a next step can be performed in sale, license, or rental of the digital knowledge 16804. In this example, the knowledge distribution system 16802 may require that an instance of the digital knowledge 16804 or a link and/or reference thereto must be uploaded to the distributed ledger 16808 prior to a transfer of funds from the knowledge recipient 16818 to the knowledge provider 16806. Another condition may be that one or more parties having adequate permission to sign a document must electronically execute a document before engaging in a transfer of one or more instances of the digital knowledge 16804. The knowledge distribution system 16802, the ledger management system 16910, and/or the distributed ledger 16808 may be preconfigured based on the type of management of digital knowledge 16804 to be executed via the knowledge distribution system 16802 and/or may be customized by one or more parties associated with the management of digital knowledge 16804 via the knowledge distribution system 16802. In some embodiments, each operation and/or management of digital knowledge 16804 via the knowledge distribution system 16802 may be encoded in a smart contract, whereby the smart contract may manage the phases of the workflow when the smart contract determines that one or more required conditions are met. In some embodiments, copies of a smart contract are stored and executed by the agents 16920 of one or more respective nodes 16916. The agent 16920 may facilitate the performance of operations that are defined in the smart contract (including validating permissions to perform the operations using the distributed ledger 16808), the reporting and recording of the performance of the operations (e.g., by generating blocks or requesting generation of blocks from the ledger management system 16910), and/or verifying that one or more conditions defined in the smart contract are met. Once a consensus is achieved with respect to one or more required conditions, the management of digital knowledge 16804 via the knowledge distribution system 16802 may progress to a next phase in the workflow. In this way, the ledger network 16970 (e.g., the ledger management system 16910 and the participating nodes 16916) may facilitate collaboration between parties in the management of digital knowledge 16804 via the knowledge distribution system 16802 by assisting in the execution of the workflow associated with the management of digital knowledge 16804 via the knowledge distribution system 16802 by validating pre-closing and closing work and/or providing a framework for the management of digital knowledge 16804 via the knowledge distribution system 16802 by way of smart contracts.

FIG. 172 illustrates a method 17200 of deploying a knowledge token 17038 and related smart contract 16840 via the knowledge distribution system 16802.

At 17210, the knowledge distribution system 16802 receives an instance of the digital knowledge 16804, such as from a user. In embodiments, the user may be affiliated with an organization (e.g., an organization that owns the digital knowledge) or an unaffiliated individual (e.g., a person who created the digital knowledge on their own or in collaboration with other unaffiliated individuals). The user may provide the instance of the digital knowledge 16804 via a graphical user interface. For example, the user may upload the digital knowledge via the graphical user interface. In embodiments, the digital knowledge may be an instruction set that may be performed by a device or set of devices. The user may upload the digital knowledge by providing the knowledge itself or a reference to the digital knowledge (e.g., an address from which the digital knowledge may be accessed/retrieved electronically).

In embodiments, the user may provide additional information, such as a type of the digital knowledge, a description of the digital knowledge, a price to be charged to access the digital knowledge, and the like. In some embodiments, the user may provide licensing data, such as any patent, trademark, copyright rights that are licensed or otherwise conveyed to a knowledge recipient, a length of the license(s) (e.g., when each license expires), a scope of the license(s) (e.g., limitations on use/sale/transferability or geographical limitations), and the like. In embodiments, the user may define validation information, such as certifications/validations of the digital knowledge. In embodiments, the user may also define limitations on the distribution of the digital knowledge (e.g., a total number of knowledge tokens that may be generated).

In embodiments, the user may define a set of conditions and/or actions that are used to generate a smart contract governing transactions for the digital knowledge. Examples of conditions may include a time period when the smart contract is valid, requirements for a recipient device (e.g., certain specifications on a device, such as a type of 3D printer, a minimum amount of processing power, required machinery to perform certain processes, or the like) that must be verified before release of the digital knowledge, requirements for a knowledge recipient (e.g., definitions of certain types of data that must be provided to ensure the knowledge recipient is eligible to receive the digital knowledge), or any other suitable conditions. In some embodiments, the user may define a set of actions that may be performed in response to certain conditions being triggered. Some of the actions that are performed by a smart contract may be default conditions, such as writing a record of the transaction to the distributed ledger or releasing the digital knowledge. In some embodiments, a user may define custom actions, such as defining allocations of funds to third-party rights holders, generating a serial number for a product that is produced by the digital knowledge, digitally signing a product that is produced by the digital knowledge, exposing an API to a knowledge recipient, or the like.

At 17212, the knowledge distribution system tokenizes the digital knowledge 16804, thereby creating a knowledge token 17038. In embodiments, the ledger management system may tokenize the digital knowledge by wrapping a smart contract around the digital knowledge to obtain the knowledge token. In some embodiments, the ledger management system may retrieve a smart contract template from the smart contract datastore, such that the smart contract template corresponds to a type of the digital knowledge that is to be tokenized. In some of these embodiments, the ledger management system may parameterize the smart contract template based on the information provided by the user and any conditions and/or actions defined by the user. For example, the smart contract may be parameterized for the instance of digital knowledge (or a reference thereto), any licenses that are granted, the price to be paid, any conditions that are to be met, and any actions to be performed. In some embodiments, the ledger management system may include any libraries in the smart contract that are needed to support any of the functions defined in the smart contract. In some embodiments, the ledger management system may configure one or more event listeners that allow the smart contract to monitor one or more data sources. In these embodiments, the ledger management system may define the data source(s) to be monitored, whereby the event listener obtains and/or processes the data from the data source(s) which is then used to determine whether a certain condition or set of conditions is met. Additional examples of tokenization may be found in the Ethereum specification, which may be accessed at https://github.com/ethereum. In embodiments, the knowledge distribution system may generate a set number of knowledge tokens, whereby each knowledge token may be used to facilitate a different transaction for the instance of digital knowledge.

At 17214, the knowledge distribution system stores the knowledge token(s) 17038. In embodiments, the ledger management system may store the knowledge token(s) by deploying the knowledge token(s) to a distributed ledger 16808. In embodiments, the ledger management system may initially assign the ownership of the knowledge token(s) to the knowledge provider. In embodiments, the knowledge distribution system may also store information relating to the instance of digital knowledge in the knowledge datastore, which may be used to populate a marketplace site where potential knowledge recipients can view information relating to the digital knowledge.

FIG. 173 illustrates a method 17300 of performing high level process flow of a smart contract that distributes digital knowledge. In embodiments, the smart contract may be a knowledge token that is stored on the distributed ledger and that is executed by one or more nodes that host the distributed ledger. In some of these embodiments, the smart contract may be executed on a virtual machine or in a container.

At 17310, the smart contract monitors one or more of the conditions defined in the smart contract. In some embodiments, an event listener obtains data (either passively or actively) from one or more data sources defined in the smart contract 16840. As the event listener obtains data from the one or more data sources, the smart contract may determine whether certain conditions are met, and if so, may perform an action that is triggered by the met conditions.

At 17312, the smart contract verifies conditions for transaction of digital knowledge and at 17314, the smart contract initiates transfer of the digital knowledge 16804. In embodiments, the smart contract may include an event listener that determines whether a requisite amount of funds have been deposited to the smart contract. Once a party has deposited the requisite amount of funds (e.g., a predefined amount of cryptocurrency or fiat currency), the smart contract may initiate the transfer of the digital knowledge to the knowledge recipient (e.g., the party that deposited the requisite amount of funds). In embodiments, this may include updating the distributed ledger with a block that indicates the change in ownership of the token to the knowledge recipient and providing any required keys to the knowledge recipient. Once the ownership of the knowledge token has been changed, the knowledge recipient may access the digital knowledge contained therein (and in accordance with any restrictions defined in the smart contract, such as using a particular type of device).

As discussed, the techniques described herein may be applied to facilitate transactions for different types of instruction sets. In some embodiments, the knowledge distribution system may be used to distribute instruction sets for 3D-printing specific products (e.g., replacement parts, medical devices, custom products, manufacturing parts, and the like). In operation, the knowledge distribution system 16802 may present a graphical user interface to a user, whereby the user may provide an instance of digital knowledge, as well as a user provider (e.g., a knowledge provider) may upload an instruction set for printing a 3D item to the knowledge distribution system 16802. In embodiments, the 3D printing instruction set may include a file (e.g., a CAD file and/or an STL file) and any accompanying instructions for printing the product defined in the file. In some embodiments, the user may also define a transaction price that defines an amount of currency (fiat currency and/or cryptocurrency) that must be paid to purchase a knowledge token containing the 3D printing instruction set. Additionally, the user may provide a description of the product and any requirements for printing (e.g., required materials and/or device types or minimum specifications needed to 3D print the product). The user may also provide additional information, such as photographs of a printed product, certifications made with respect to the product, and the like.

In embodiments, the user may define any intellectual property rights that are being licensed or otherwise conveyed to a knowledge recipient with the digital knowledge (also referred to as an intellectual property stack) with the transaction for the 3D printing instruction set. In some embodiments, the user may define an allocation schedule that defines how royalties are divided amongst one or more licensors. For example, if the product that is printed from the instance of digital knowledge is licensed under one or more patents, design patents, copyrights, and/or trademarks, a portion of the transaction price for each printed product may be allocated to the licensors as royalty payments. In this example, the user may identify the licensor(s) that collect the royalties and may assign a percentage or amount of the royalties that go to each respective licensor. In embodiments, the user may define any geographical limitations on the digital knowledge. For example, the user may define countries, regions, jurisdictions, or other geographical areas to which the digital knowledge may or may not be distributed. In embodiments, the user may further define other types of permissions or restrictions, including 3D printer requirements (e.g., a set of 3D printer types, makes and models that can print the product, serial numbers of 3D printers that can print the product, material types that must be used to print the 3D product, and the like), a time period during which the item can be 3D printed, whether the digital token may be transferred to a downstream recipient, or the like. In embodiments, the user may define actions that are performed in connection with 3D printing an object, such as assigning a serial number to the product (which may or may not be printed to the object), and/or the like. In embodiments, the user may further define any warranties, disclaimers, indemnifications, and/or the like associated with the 3D-printed product.

In embodiments, the smart contract system 17068 may generate knowledge tokens 17038 that contain the digital knowledge (or a reference thereto). In some embodiments, the smart contract system 17068 may tokenize the digital knowledge by wrapping the digital knowledge (e.g., the 3D printing instruction set or a reference to the instruction set) with a smart contract wrapper. In some embodiments, the smart contract system 17068 may obtain a smart contract template and may parameterize the smart contract using some of the information entered in by the user, such as price, license fee allocations, geographic restrictions, other restrictions, custom actions (e.g., assigning serial numbers), if/when the token expires, 3D printer requirements, and the like. In some embodiments, each knowledge token that is generated for the 3D printer instruction set may be assigned a different serial number, such that each 3D-printed product may be identified by its serial number and associated with the token from which it was printed. In this way, the product may be verified and tied to a particular record in the distributed ledger. In embodiments, the smart contract system 17068 may output the generated knowledge tokens to the ledger management system 16910.

In embodiments, the ledger management system 16910 may upload the knowledge tokens on the distributed ledger. In some embodiments, the ledger management system 16910 may generate a block containing the knowledge tokens and may broadcast the block to the distributed ledger 16808, whereby a knowledge recipient may then transact for one or more of the knowledge tokens (e.g., to print one or more respective products using the 3D printing instruction set). In some embodiments, one or more of the recipient nodes may execute the smart contracts that wrap the digital tokens, whereby the smart contract listens for one or more triggering conditions (e.g., receiving an amount of currency equal to the transaction price of the knowledge token). Additionally or alternatively, the ledger management system 16910 may execute the smart contracts (e.g., in containers) and may record the transaction for the knowledge token to the distributed ledger.

In embodiments, the knowledge distribution system 16802 may provide or connect to a digital knowledge marketplace, whereby potential recipients may purchase knowledge tokens corresponding to respective 3D-printing instruction sets. For example, the marketplace may display items that may be 3D printed, such as airplane parts, car parts, machinery parts, other types of replacement parts, toys, medical devices, and/or the like. A potential recipient may enter into a transaction for a particular 3D printing instruction set. In embodiments, the potential recipient may select one of the items. In response, the knowledge distribution system may present the price of each token, the restrictions associated with the knowledge token (e.g., any device requirements, geographical restrictions, use limitations, and/or the like), warranties, disclaimers, indemnifications, certifications, and/or the like to the potential recipient. The potential recipient may then choose to accept the terms of the transaction (e.g., agree to buy the token). The potential recipient may then commit a defined amount of currency to the transaction. In response, the smart contract may listen for additional conditions (if so defined) before completing the transaction and/or releasing the digital knowledge. For example, the smart contract may request the potential recipient to verify that the printer requirements are met or may connect to the 3D printer to verify the requirements. If all the conditions required to complete the transaction are met, the smart contract may provide the currency to the knowledge provider (and any other licensors) and may perform any other actions, such as releasing the digital knowledge to the 3D printer (or another device), broadcasting a block to the distributed ledger verifying the transaction and/or recording the serial number in the distributed ledger. The 3D printer may receive the 3D printing instructions and may print the product in accordance with the 3D printing instruction set.

In embodiments, the knowledge distribution system 16802 may be deployed on or integrated with or within a set of infrastructure capabilities, such as cloud computing infrastructure, platform-as-a-service infrastructure, Internet of Things platform capabilities, distributed database capabilities, data management platform infrastructure, enterprise database resources (including cloud and on premises resources), and the like. In embodiments, the knowledge distribution system 16802 may use or integrate with or within various services, such as identity management services, information management services, digital rights management services, information rights management services, cryptographic services, key management services, distributed database services, and many others.

Referring to FIG. 174, in embodiments, the knowledge distribution system 16802 may provide one or more collaboration APIs 17474 for facilitating collaboration between users. The collaboration APIs may be configured to allow users to provide and share information to establish a shared set of data resources for collaboration, such as to provide a shared "ground truth" as to underlying facts, to establish a set of alternative views regarding the underlying facts (e.g., to identify where there may be disagreement as to the ground truth or the absence of information that is needed to establish shared understanding), to facilitate management of a set of scenarios with respect to which collaboration is desired, to facilitate a set of simulations relating to topics of interest for collaborators, to facilitate controlled access to shared and non-shared knowledge elements, and/or to allow users to provide, verify, and/or share information outside of enterprise firewalls. The collaboration API 17474 may be configured to allow users and/or parties to provide, receive, share, and/or verify information, such as the digital knowledge 16804, information related to the digital knowledge 16804, information related to transactions performed via the distributed ledger 16808, via one or more smart contracts 16840, via the marketplace system 17454, and the like. The APIs may be configured to allow for sharing of information privately, publicly, or a combination thereof. Information shared via the APIs, or events or transactions relating thereto, may be stored on the distributed ledger 16808 and thereby be distributed across the nodes 16916 of the distributed ledger. The users may include the knowledge providers 16806, the knowledge recipients 16818, the crowdsources 16836, the users and/or parties to the distributed ledger 16808 and/or the digital marketplace 17456, and the like.

In some embodiments, the collaboration API 17474 may include operational and/or situational knowledge that may be captured by the knowledge distribution system 16802. The collaboration API 17474 may be configured to process the situational knowledge and transmit the situational knowledge and/or interpretations of the situational knowledge to the ledger management system 16910. The ledger management system 16910 may be configured to store the situational knowledge and/or interpretations of the situational knowledge on the distributed ledger 16808. An example of situational knowledge is data regarding current condition, state, and/or location of a piece of collateral related to an instance of the digital knowledge 16804 and/or related to a smart contract 16840. Another example of situational knowledge is a state of completion of a work-in-progress that is subject to a transaction, a term of payment and/or lending triggered by completion of an item (e.g., an instance of the digital knowledge 16804) to a certain stage of completion.

In embodiments, the smart contract system 16868 may include one or more transaction frameworks 17476 configured to facilitate managing transactions via the smart contracts 16840. The transaction frameworks 17476 may include one or more data structures, routines, subroutines, and the like configured to assist in management of transactions, such as by automatically importing, exporting, sorting, configuring, handling, or otherwise processing data related to transactions handled via the knowledge distribution system 16802. The smart contract system 17068 may be configured to include one or more transaction frameworks 17476 related to billing, payments, reporting, auditing, reconciliation, and/or the like.

In embodiments, each of the transaction frameworks 17476 may be configured to facilitate management of one or more particular types of transactions. Examples of types of transactions and related data of which one or more of the transaction frameworks 17476 may be configured to facilitate management include purchase/sale, lending/leasing, rental, licensing, resource/time sharing, service contracts, maintenance/repair, warranty, guaranty, insurance, profit/revenue sharing, manufacturing (optionally tiered), resale/distribution (optionally tiered), demand aggregation, forward market/futures transactions, and conditional/contingent contracts, among others, including any of the many types describe in this disclosure and the documents incorporated herein by reference. For example, in a tiered distribution contract framework, the transaction framework 17476 may be configured to use the distributed ledger 16808 and the smart contract 16840 to allocate one or more of payments, commissions, and costs in a granular manner. In another example, in a contingent contract framework, the transaction framework 17476 may be configured to use the distributed ledger 16808 and the smart contract 16840 to manage one or more of options, futures, emergent events, and the like. Other examples of smart contract frameworks 17476 include those configured to manage commissions, incentive payments, payments for milestones (e.g., partial work, delivery partway through a supply chain, etc.), and escrows.

In embodiments, one or more of the transaction frameworks 17476 may be configured to facilitate management of the smart contracts 16840 in situations in which there are issues with performance by one or more parties to an agreement. Issues with performance may include, for example, breach of contract, failure to pay, late payment, poor performance, poor quality goods, failure to perform services, and the like. Remedies for issues that may be encoded in the transactional frameworks 17476 may include pulling functionality, loss of license, ramping down of performance, financial penalties (e.g., loss of tokens or currency) and the like.

In embodiments, the transaction framework 17476 may facilitate using the distributed ledger 16808 and the smart contract 16840 to allocate risk and liability in a granular manner. The knowledge distribution system 16802 may be configured to import sensor data from one or more sensors, such as IoT sensors. The sensor data may include single sensor data, multiple sensor data, fused sensor data (e.g., where results from two or more sensors are joined, such as by multiplexing, by computation, or the like), raw sensor data, normalized sensor data (such as to allow comparison to a scale, such as a quality scale, a condition scale, or the like), calibrated sensor data (such as to allow comparison to other sensors on an accurate basis), and others. In embodiments, the sensor data may indicate the state or condition of a physical item or its environment at a point in time or over a period of time, such as its temperature, the ambient temperature of the environment in which it is located, environmental humidity, movements of the item (such as resulting from impacts, vibration, transport, or the like), exposure to heat, exposure to radiation, exposure to chemicals (including particulates, toxins, and the like), bearing of loads, bearing of weight, exposure to stress, exposure to strain, exposure to impacts, damage (such as dents, deformations, deflections, disconnects, breaks, cracks, shatters, tears and many others), exposure to biological factors (including pathogens), extent of progressive damage (such as rust), and other factors. In embodiments, the sensor data may indicate the presence or absence of activities or workflows related to an item, such as where sensor data indicates fluid levels (e.g., oil or other lubrication, fuels, antifreeze, and other fluids, which indicate whether required maintenance, such as an oil change, has been timely performed), levels of particulates or other matter (such as dirt, grime, sand particles, and many others, which may indicate whether required cleaning has occurred), levels of rust, and many others. In various embodiments, the imported sensor data may allow the smart contract system 17068 to allocate related to performance, lack of performance, utilization, deterioration, wear-and-tear, damage, maintenance activity, or other relevant factors that may be attributed to individual parts of a tiered manufacturing system (including individual machines, equipment items, devices, component parts, or the like) to particular related parties via the transaction framework 17476. As one example among many, a series of parties in possession of an item may be allocated responsibility for depreciation, deterioration, or other reduction in its value based on their measured activities with respect to its caretaking, such as the environmental conditions in which it was stored and the presence or absence of required maintenance activities, such as fluid changes, cleaning, and the like. For example, a party that stored the item in pristine conditions at specified temperatures and replaced fluids according to a defined schedule might be assigned a moderate number of points (or other metrics), while a party that stored the item outdoors in poor conditions might be assigned a much higher number of points, in automatically allocating responsibility for the replacement of the item by a smart contract. Similarly, a party whose actions or lack of actions can be directly measured as causing damage (e.g., the item was dropped and dented while in the party's possession), may be automatically allocated responsibility for the damage. Thus, a sensor-enabled smart contract may track and allocate responsibility for conditions and activities involving a physical item across its lifetime, including among parties that share or transfer possession of the item, share use of the item, or the like. Shared use or possession over the lifetime may include situations of tiered manufacturing, such as where component parts are progressively configured into an overall system by a set of parties. In such a situation, a smart contract may use sensor data collected throughout manufacturing to determine responsibility for a failure of an item (e.g., a manufacturing defect) based on what part of the item failed and/or why an item failed (such as due to a problem in the manufacturing chain). Shared use of possession may also include “shared economy” situations, such as shared use of property (including rooms, office space, homes, apartments, real estate, vehicles, electronic devices, and many others), where a smart contract may allocate responsibility for damage, maintenance (or lack thereof), cleaning, and other factors based on sensor data collected over the lifetime of the shared item. In embodiments, the smart contract framework 17476 may also provide for inclusion of indemnity clauses and more complex causes allocating liability and/or limitation thereof (including exceptions to the same) which may include factors related to the sensor data collected over time as noted above. For example, a smart contract may limit a manufacturer’s liability for defects to a period (e.g., ninety days, one year, or the like) but the smart contract may embody an exception for hidden defects (e.g., ones that were present but did not manifest during the warranty period). Sensor data may indicate whether a defect was manifested or not during the base warranty period and automatically determine whether a warranty claim asserted after the period is valid. In embodiments, such a smart contract may further allocate, and optionally execute a transfer of value, such as currency, upon determination of the ultimate responsibilities among parties, such as where one party has indemnified another for a type of liability. In embodiments, a smart contract may be configured to perform a computation and allocation of net liability among multiple parties to a contract that involves indemnification by one or more parties of another. In embodiments, such a smart contract may consume sensor data that is used to determine the extent of liability to be allocated to each party (e.g., where a party’s actions or inactions may result in sensed changes of the condition of an item that may trigger greater responsibility for indemnification of others). In embodiments, such a smart contract may automatically credit or debit an account, trigger a transfer of value, or the like.

In embodiments, the transaction framework 17476 may facilitate using the distributed ledger 16808 and the smart contract 16840 to allocate payments, commissions, costs, and the like in a granular manner. The transaction framework 17476 may facilitate inclusion in the smart contract 16840 and management by the smart contract 16840 of one or more parties to a set of distribution agreements, value added reseller agreements, manufacturer agreements, sub-distributor agreements, sub-licensee agreements, payment agreements, servicing agreements, maintenance agreements, update agreements, upgrade agreements, rental agreements, resource sharing agreements, item-sharing agreements, warranty agreements, insurance agreements, lending agreements, indemnification agreements, guarantee agreements, and the like.

In embodiments, the transaction framework 17476 may facilitate management and/or execution of contingent contracts via the distributed ledger 16808 and the smart contract 16840. The contingent contracts may include clauses whereby a provision of a good, service, payment, and the like is contingent on one or more triggering events taking place. For example, admission tickets for a sporting event may be sold to a fans of a plurality of sports teams, with validity of the ticket and/or the related transaction being contingent on the team of which the fan is a fan of being eligible to participate in the sporting event. In embodiments, the transaction framework 17476 may have one or more data collection facilities, such as web crawlers, spiders, clustering systems, sensor data collection systems, services, APIs, or the like that collect data indicating the presence or absence of a triggering condition for the contingent contract, such as, in the example of an event-triggered contract, a system that searches for the existence of an event involving a particular performer, player, or team (among others) in an event, and the smart contract may automatically handle the allocation of rights that are triggered by the occurrence of the event. For example, where the right to attend the Super Bowl (or other game) is triggered by a particular team’s presence in the game (or in similar examples where an attendance right is triggered by emergence or realization of a desired instance of a type of event), the smart contract transaction framework 17476 may automatically determine (such as via a search engine or other capability operating on news data sources) the triggering event (e.g., that a given team won a conference championship game resulting in becoming a participant in the league championship, or other similar example, or the a particular performer or group has announced a date and place for a concert tour or other performance). Further, the smart contract transaction framework 17476 may trigger a set of actions upon the automatic determination of the instance of the triggering event, such as transferring ticket rights to parties for whom the rights vest upon the event, informing other parties that their contracts are closed (i.e., that there remains no possibility of the event occurring under the defined conditions for those parties, such as holders of rights related to teams that did not make it to the championship games), allocating consolation prizes to losing parties, triggering other smart contracts (such as smart contracts that allocate provision of related goods and services, such as travel and transportation services (e.g., automatically securing airline tickets based on the location of the ticket holder and the location of the game, automatically securing a rental car, and the like), hospitality services (e.g., automatically securing a hotel reservation in the city of the game for a fan that does not live in the city, automatically securing reservations for meals, and the like).

In embodiments, a smart contract for an event embodying automatic detection of triggers for contingencies related to the emergence or realization of an instance of an event, and embodying automatic allocation of rights (such as attendance rights, travel and hospitality rights, and the like) based on the triggers may include, take input from, use, connect with, link to, and/or integrate with a set of intelligent agents, such as using any of the artificial intelligence, machine learning, deep learning, and other techniques described herein or in the documents incorporated by reference herein, including robotic process automation trained and/or supervised by human experts. The set of intelligent agents may include ones that are trained, for example, (a) to determine and manage a set of possible events (such as what teams could be involved in what games at what locations and what points in time across a set of leagues, sports, locations and the like), including expanding or pruning the list based on game results and other factors (e.g., where teams fall out of contention for playoff spots, rendering previously possible games impossible); (b) to forecast probabilities of likelihood of instances of event based on current and historical data (e.g., the likelihood that a game will occur between two particular teams, the likelihood that a performer will hold a concert at a given location (or within a geofence) during a date range, or the like); (c) to generate and configure a smart contract that governs allocation of rights subject to contingencies, including setting parameters for the launch (e.g., by auction, by lottery, by "drop" or the like) of a marketplace or other venue by which parties may enter into the smart contract for the contingent event; (d) to forecast demand for an instance of a contract (e.g., demand for Final Four tickets in New Orleans if University of Kentucky is playing; or demand for Elton John tickets in Paris during Q3 of a given year; among many others) based on a given type of contingent event, such as based on historical demand for similar events (optionally using various clustering and similarity techniques operating on historical attendance data, secondary market ticket data and other data sets), expressed demand (including demand expressed in demand aggregation contracts, such as where some users have purchased options for the event or similar events), historical data on contingent smart contracts for similar items or services, secondary indicators of demand (such as search engine metrics, social media metrics and the like) and many others; (e) to set initial pricing for events, including based on the forecast demand and historical pricing data for underlying events (e.g., ticket prices, secondary market prices and activity levels, time required to sell out tickets and the like) and for other contingent event contracts; (f) to manage allocation of smart contracts, such as in tranches of release; (g) to collect and manage party-specific factors and user profiles, such as understanding location factors (e.g., place of residence, place of work), affinity and loyalty factors (favorite teams, favorite restaurants, favorite airlines, favorite hotel chains, favorite types of food, and others), and others; (h) to manage matching of party-specific factors and user profiles to contingent events (such as to find and present smart contract opportunities that fit a user's profile, such as ones involving possibilities of attending events with a favorite team, player or performer involved); and (i) to manage discovery and presentation of, and configuration of parameters for, smart contracts that embody other goods and services that may be paired with a contingent event smart contract (such as automatically finding and matching an appropriate airline flight, train reservation, bus ticket or the like and configuring a contingent smart contract for the same between the transportation provider and the prospective event ticket holder; automatically finding and matching an appropriate hotel reservation and configuration a smart contract hotel reservation between the prospective ticket holder and the hotel provider, or creating similar contingent smart contracts among providers and prospective ticket holders for other travel, accommodations and hospitality packages, such as restaurant reservations, rental cars, and many others); among others. Thus, the set of AI-enabled intelligent agents may provide automation of various capabilities for enabling the creation, hosting, provisioning, and resolution of a marketplace for contingent event smart contracts.

In embodiments, the transaction framework 17476 may facilitate demand aggregation via the distributed ledger 16808 and the smart contract 16840. The transaction framework 17476 may aggregate demand for one or more products and/or services accumulated via analytics, commitments, options, or any other suitable source. Upon accumulation of demand, such as by a demand metric meeting a demand threshold, the smart contract 16840 may trigger to begin design, manufacturing, distribution, and/or the like of the related product and/or service. In embodiments, a set of intelligent agents, using various AI capabilities noted above, may be configured facilitate demand aggregation, including agents that may (a) forecast demand for an instance or type of product, such as based on various secondary indicators of demand, such as search engine metrics, chat activity (e.g., in relevant forums), event information (such as attendance at relevant industry events), social media information (such as numbers of posts), product sales, historical selling times (e.g., time from product launch to selling out of a product), and many others; (b) aggregate demand, such as by configuring a set of smart contracts by which parties commit to purchasing an item upon its instantiation, such as during a given time window within a given price range and determining a total aggregate demand; (c) projects the cost a demand-aggregated offering, such as based on a model (optionally itself managed and/or created by an intelligent agent) that indicates the projected cost of an item at various volumes of production, optionally based on a projection or model of the likely component parts and cost thereof, as well as other costs, such as assembly, transportation, financing, warranty and the like; (d) projects the price of the demand-aggregated item at various volumes of offering, such as based on the forecast demand and historical pricing; (e) forecasts the profit likely to be associated with offering the demand-aggregated item at various volumes of production and/or at various points in time, such as using the forecasted demand, cost and pricing information; and the others. Thus a demand aggregation marketplace may be enabled and/or supported by automation capabilities provided by the set of intelligent agents.

In embodiments, the smart contract system 16868 may be configured to import patterns of implementation and/or systems building knowledge into one or more of the transaction frameworks 17476. The patterns of implementation and/or systems building knowledge may include, for example, knowledge systems, workflow, product management, support calls, human interaction, social media, redundant systems, data storage, and implementation patterns at scale. The smart contract system 16868 may automatically configure the smart contracts 16840 to implement the imported patterns of implementation and/or systems building knowledge. The imported patterns of implementation and/or systems building knowledge may be stored in the datastore 16858.

In some embodiments, the knowledge distribution system 16802 may include an artificial intelligence (AI) system 17480 in communication with the ledger management system 16910 and/or the smart contract system 17468 and configured to perform AI-related tasks according to a machine learned model. The AI system 17480 may be configured to perform actions with respect to the knowledge distribution system 16802 to manage the digital knowledge 16804. The AI system 17480 may have permission and access rights to manage, use, and interact with systems of the knowledge distribution system 16802 similarly to a user.

In embodiments, the AI system 17480 may be trained by one or more transaction experts to develop the machine learned model by which the AI system 17480 operates to perform AI-related functions. Examples of transaction experts that may at least partially train the AI system 17480 include agents, brokers, traders, attorneys, financial advisors, auditors, accountants, bankers, marketers, advertisers, exchange operators, buyers, sellers, distributors, and manufacturers/developers. The AI system 17480 may be trained by any suitable machine learning algorithm, and by any suitable training data set. Examples of machine learning algorithms include supervised learning, unsupervised learning, semi-supervised learning, reinforcement learning, self-learning, feature learning, sparse dictionary learning, anomaly detection, robot learning, and association rules. The machine learned model may be any suitable type of model, such as an artificial neural network, a decision tree, a support vector machine, a regression analysis model, a Bayesian network, or a genetic algorithm.

In embodiments, the AI system 17480 may be trained to identify opportunities for smart contracts. Examples of opportunities include exchange opportunities and arbitrage opportunities.

In embodiments, the AI system 17480 may be trained to configure market contract terms and conditions.

In embodiments, the AI system 17480 may be trained to monitor market conditions.

In embodiments, the AI system 17480 may be trained to monitor and manage contract terms and conditions. Monitoring and managing contract terms and conditions may include monitoring goods and/or observing services.

In embodiments, the AI system 17480 may be trained to monitor and manage transaction processes. For example, the AI system 17480 may be trained to recognize release of funds from an escrow account.

In embodiments, the AI system 17480 may be trained to monitor counter-party information. Examples of counter-party information include solvency, and status of performance, and quality of performance.

In embodiments, the AI system 17480 may be trained to identify transaction opportunities. Examples of transaction opportunities include instances of exchange and arbitration opportunities.

In embodiments, the AI system 17480 may be trained to negotiate on behalf of parties to transactions involving digital knowledge.

In embodiments, the AI system 17480 may be configured to configure and execute auctions. The AI system 17480 may perform auction-related actions such as selecting a type of auction suitable for a transaction and/or settings rules and parameters for an auction to be at least partially carried out on the distributed ledger 16808. The auctions selected may be any suitable type of auction for being at least partially carried out on the distributed ledger 16808, such as a Dutch auction or a reverse auction.

In embodiments, the AI system 17480 may be configured to distribute currency tokens and/or tokenized digital knowledge 16804.

In embodiments, the AI system 17480 may be configured to configure and manage exchange of the digital knowledge 16804 across different marketplaces and exchanges. The AI system 17480 may set exchange rates between native currencies of exchanges and/or may tokenize the digital knowledge 16804 and set exchange rates between instances of the tokenized digital knowledge 16804.

In embodiments, the AI system 17480 may be configured to establish, monitor, and/or negotiate payment, leasing, and/or lending options related to management of the digital knowledge 16804. The lending options may include payment plans, trust-less scenarios, and/or non-trust-less scenarios.

In embodiments, the knowledge distribution system 16802 may include a robotic process automation (RPA) system 17482 in communication with the AI system 17480 and configured to improve one or more functions of the AI system 17480. The RPA system 17482 may use robotic process automation techniques to allow the AI system 17480 to interface with one or more of systems of the knowledge distribution system 16802, the distributed ledger 16808, and systems, marketplaces, and/or exchanges and the like external to the knowledge distribution system 16802 by performing actions in one or more graphical user interfaces of the knowledge distribution system 16802, the distributed ledger 16808, and systems, marketplaces, and/or exchanges and the like external to the knowledge distribution system 16802.

In embodiments, the knowledge distribution system 16802 may include a rights management system 17484 configured to manage rights of users apart from an exchange or marketplace.

In embodiments, the knowledge distribution system 16802 may include a market management system 17486 configured to establish a market for selling and/or reselling currency tokens and/or instances of the digital knowledge 16804. The market may be configured such that wrapped and/or tokenized instances of the digital knowledge 16804 may be resold without being unwrapped. The market may be established and configured as a spot market, a secondary market, and/or a futures/derivatives market. Futures and derivatives resold on the futures/derivatives market may include options, futures, and other derivatives. The knowledge distribution system 16802 may establish and/or monitor secondary markets, ancillary markets, forward markets, and the like in addition to resale markets for digital currency and instances of the digital knowledge 16804.

In embodiments, the market management system 17486 may be configured to monitor metrics of users, buyers, and/or sellers participating in one or more markets established by the market management system 17486. The metrics may include, for example, metrics indicating how, where, or how often an instance of the digital knowledge 16804 is used. The metrics may alternatively or additionally include metrics regarding creation of the digital knowledge 16804, duration during which a given type of digital knowledge 16804 remains relevant or valuable, and/or metrics regarding transaction patterns. Examples of transaction patterns include size of transaction, transaction pricing and trends thereof, profile information of buyers, sellers, consumers, users, and/or creators of the digital knowledge 16804, and the like. Another metric additionally or alternatively monitored by the markets system may include metrics indicative of gaming and/or misconduct by users of the market.

In embodiments, the digital knowledge 16804 may include instruction sets such as: process steps in food production or food preparation instructions (e.g., for industrial food preparation), additive manufacturing/3D printing instructions, instruction sets for surgical robots and human/robot interfaces generally, crystal fabrication system instructions, crystal fabrication process instructions, polymer production process instructions, chemical synthesis process instructions, coating process instructions, semiconductor fabrication process instructions, silicon etching instructions, doping instructions, chemical vapor deposition instructions, biological production process instructions, smart contract instructions, and/or instructions for establishing, updating, and/or verifying a chain of work, possession, title, and the like.

In embodiments, the digital knowledge 16804 may include code, software, and/or logic, such as: algorithmic logic, instruction sets for use in an application, executable algorithmic logic, computer programs, firmware programs, instruction sets for field-programmable gate arrays, instruction sets for complex programmable logic devices, serverless code logic, cryptography logic, AI logic, AI definitions, machine learning logic and/or definitions, and/or quantum algorithms.

In embodiments, the digital knowledge 16804 may include digital documents, such as digital documents relating to: part schematics, production records (e.g., for aircraft parts, spaceship parts, nuclear engine parts, and the any/or any other suitable part), automobile parts, airplane parts, pieces of furniture or components thereof, replacement parts for industrial robots or machines, trade secrets, and/or other intellectual property such as know-how, patented material, and/or works of authorship.

In embodiments, the digital knowledge 16804 may include 3D printing schematics, such as schematics for printing medical devices, automobile parts, airplane parts, furniture, furniture components, and/or replacement parts for industrial robots or machines.

In embodiments, the digital knowledge 16804 may include personal and/or professional knowledge relating to one or more organizations and/or individuals. The personal and/or professional knowledge may include: professions resumes, professional history tracking information, records of professional credentials, academic degrees, professional certificates, verifications of professional positions held by one or more individuals, professional feedback, verification of work performed by one or more individuals and/or parties, personal financial history, business financial history, and/or personal life achievements as verified by one or more third parties.

In some embodiments, the digital knowledge 16804 may include data sets and/or sensor information defining and/or population a set of digital twins. The digital twins may embody one or more instances of the digital knowledge 16804 relating to one or more physical entities. The one or more instances of the digital knowledge 16804 may include knowledge related to one or more of configurations, operating modes, instructions sets, capabilities, defects, performance parameters, and the like.

In embodiments, the knowledge distribution system 16802 may be configured to transmit instances of the digital knowledge 16804 to and/or receive instances of the digital knowledge 16804 from one or more external knowledge exchanges and/or knowledge databases. The external knowledge exchanges and/or knowledge databases include domain-specific exchanges, geography-specific exchanges, and the like. The knowledge distribution system 16802 may be configured to facilitate exchange of valuable or sensitive instances of the digital knowledge 16804 related to the subject matter of the external knowledge exchange and/or knowledge database. Additional or alternative examples of external knowledge exchanges and/or databases may include stock exchanges, commodities exchanges, derivative exchanges, futures exchanges, advertising exchanges, energy exchanges, renewable energy credits exchanges, cryptocurrency exchanges, bonds exchanges, currency exchanges, precious metals exchanges, petroleum exchanges, goods exchanges, services exchanges, or any other suitable type of exchange and/or database. The knowledge distribution system 16802 may integrate and/or communicate with interfaces of external knowledge exchanges and/or databases, such as APIs connectors, ports, brokers. The integration and/or communication may be facilitated via one or more of extraction, transformation, and loading (ETL) technologies, smart contracts, wrappers, tokens, containers, and the like.

In embodiments, the knowledge distribution system 16802 may be deployed on and/or integrated with or within a set of infrastructure capabilities. Examples of infrastructure capabilities include cloud computing infrastructure, platform-as-a-service infrastructure, Internet of Things platform capabilities, distributed database capabilities, data management platform infrastructure, enterprise database resources (including cloud and on premises resources), and the like.

In embodiments, the knowledge distribution system 16802 may use and/or integrate with or within various services. Examples of services with which or within which the knowledge distribution system 16802 may integrate include identify management services, information management services, digital rights management services, information rights management services, cryptographic services, key management services, distributed databased services, and the like.

In some embodiments, the knowledge distribution system 16802 may be configured to facilitate creation, management, and execution of contingent event contracts based on demand aggregation. The contingent event contracts may be, for example, smart contracts 16840 having contingent events based on demand aggregation. The knowledge distribution system 16802 may collect demand aggregation by having crowdsources 16836 indicate demand for an instance of digital knowledge 16804. The crowdsources 16836 may indicate demand for an instance of digital knowledge 16804 by, for example, contributing currency toward development or generation of the digital knowledge 16804. The knowledge distribution system 16802 may facilitate indication of demand, such as by establishing a website, app, or other service that collects indications of demand. The knowledge distribution system 16802 may additionally or alternatively aggregate demand indicated by third party sources, such as by websites, apps, or other systems or services external to the knowledge distribution system 16802.

In some embodiments, the knowledge distribution system 16802 may be configured to create a point in time or reference knowledge dataset via tokenization of one or more instances of the digital knowledge 16804. For example, one or more event contracts may be triggered by a set of events based on one or more instances of digital knowledge 16804. The knowledge distribution system 16802 may input a tokenized instance of the digital knowledge 16804 as a trigger to the event contract. The knowledge distribution system 16802 stores the tokenized instance of digital knowledge on the distributed ledger 16808 as a historically trackable digital asset, thereby creating a fungible record of tokenized knowledge.

In some embodiments, the knowledge distribution system 16802 facilitate timestamped input and output control of instances of the digital knowledge 16804. The knowledge distribution system 16802 may be configured to facilitate sale of instances of the digital knowledge 16804 as well as tokenized instances of the digital knowledge indicative of times and/or references related to the digital knowledge 16804. For example, as a plurality of instances of digital knowledge 16804 are developed, created, and/or stored. Tokenized instances of the digital knowledge 16804 may be stored on the distributed ledger 16808 with immutable time references. The knowledge distribution system 16802 may facilitate sale, lease, or other transactions of the timestamped tokens in addition to or alongside execution of one or more smart contracts for the sale, lease, or other transaction related to sale of the instances of digital knowledge 16804 around which the timestamped tokens were generated and stored.

In some embodiments, knowledge token 17038 is a non-fungible token. Non-fungible token or NFT represents a digital knowledge asset that is unique, or one-of-a-kind and has at least a unique identifier, and/or other distinguishable asset-specific information. The instances of digital knowledge may be referred to as "digital knowledge assets." The NFT may be used, at least in part to signify an ownership of the asset. In embodiments, the NFT can represent any percentage of the ownership rights including complete ownership rights to a small fractional ownership of a digital knowledge asset. The extent of the rights including access, licensing, ownership and/or other suitable rights associated with the NFT may be specified by the knowledge provider in the smart contract. For example, a patent assignee may mint a patent NFT with complete ownership rights including the right to sue for infringement. Further, NFTs may be coded to contain exhaustive, publicly verifiable metadata and data about transaction history.

In embodiments, the knowledge token 17038 may be implemented as a non-fungible token (NFT) on Ethereum blockchain using technical standard ERC-721 (where "ERC" stands for Ethereum Request for Comment). ERC-721 is a standard interface used to create, track, and manage non-fungible tokens in the Ethereum blockchain. In ERC-721, each token is completely unique and non-interchangeable with other tokens, and thus non-fungible. The ERC-721 standard outlines a set of common rules that all tokens may follow on the Ethereum network to produce expected results. Further, the standard may stipulate characteristics about a how token ownership is decided, how are tokens created, how are tokens transferred, and how are tokens burned.

In embodiments, the NFT representing digital knowledge asset may be traded, licensed, sold, auctioned, or otherwise monetized at a NFT marketplace or exchange. Some examples of such marketplaces include Opensea, Rarible, Foundation, Atomic hub, and the like. An owner of an NFT representing a digital knowledge asset may upload the NFT and/or the metadata associated with the asset on the NFT marketplace.

As one example, a patent may be tokenized as a dynamic NFT where the value/price of the NFT is dynamic during the lifetime of the patent and can change based on real-world events like legal or transactional events. Some examples of events that may affect the NFT value/price include prosecution events, invalidity or litigation events, and licensing or sale events. An owner or assignee of a patent (knowledge provider) may choose to monetize the patent by offering one or more NFTs to be traded, licensed, sold, or auctioned at an NFT marketplace or exchange. The assignee may upload a digital representation of the NFT and/or the metadata associated with the patent. For example, if the patent is an issued patent, an image of the front page of the patent including the patent number, title, abstract, one or more figures, etc. may be uploaded. Additionally, price, ownership, and trading history along with smart contract terms may be provided. The following is an example template for a smart contract for a patent NFT:

Whereas, ABC LLC, located at 123 XYZ ("Seller") owns the interest in U.S. Pat. No. ______ (the "Patent") assigned to it through the inventor assignment recorded with the US Patent and Trademark Office at Frame ______ (USPTO Patent Assignment Search).

Whereas, ______ located at ______ ("Buyer") wishes to acquire all Seller's right, title, and interest in and to the Patent.

Whereas, Seller has received from Buyer proceeds from the winning bid in the NFT Auction (the "Auction Consideration").

ASSIGNMENT. For receipt of the Auction Consideration, Seller hereby sells, assigns, transfers, and sets over to Buyer Seller's entire right, title, and interest in and to the Patent, including Seller's right to sue for, settle and release past, present, and future infringement of the Patent.

Signature: ______

Smart contract 16840, ensure that the ownership of the patent NFT may be changed quickly, efficiently, securely, and transparently. Patent NFTs, an example for which is provided above, enable efficient first-sale purchases, secondary market trading, collateralized borrowing/lending, and insurance markets for the patents, thereby adding liquidity, efficiency, and transparency to an otherwise illiquid and opaque market.

FIG. 197 is a diagrammatic view illustrating an example implementation of the knowledge distribution system including a trust network 19702 for identifying the likelihood of fraudulent transactions using a consensus trust score and preventing such fraudulent transactions according to some embodiments of the present disclosure.

The trust network 19702 is configured to identify the likelihood of fraudulent transactions on the ledger network 16970 by generating and tracking a consensus trust score for the nodes of the network. The consensus trust scores can offer transactors in the ledger network 16970 a safeguard against fraud while preserving user anonymity and autonomy. The consensus trust score may be generated based on data retrieved from various data sources (e.g., fraud/custody data) along with data retrieved from the nodes of the ledger network 16970. The consensus trust score may be a number (e.g., a decimal or integer) that indicates a likelihood that the blockchain address is involved in fraudulent activity. Put another way, a trust score can represent the propensity of a blockchain address to be involved with fraudulent activity.

Any party to a transaction (e.g., knowledge provider 16806) may request the consensus trust score from the trust network 19702 before engaging in a transaction in which funds (e.g., tokens) are transacted on the blockchain. In general, a party to a transaction can use a consensus trust score to determine whether the blockchain address with which they are transacting is trustworthy. The transacting parties may use the consensus trust scores to take a variety of actions. For example, parties may use consensus trust scores to determine whether to proceed with or cancel a transaction. As another example, parties (e.g., digital exchanges) can use consensus trust scores to determine whether to insure a transaction. As such, the consensus trust scores described herein can help protect parties from falling victim to fraud or from receiving fraudulent funds. Note that the consensus trust scores inform the transactors of the degree to which any cryptocurrency address may be trusted without requiring the transactor to know the identity of the party behind the address.

The trust network 19704 may include a plurality of trust nodes 19704-1, 19704-2, . . . , 19704-N (referred to herein as "nodes"). Each of the nodes may include one or more node computing devices (e.g., one or more server computing devices) that implement a variety of protocols described herein. The nodes 19704-*x* may acquire data associated with blockchain addresses and determine a variety of trust scores based on the acquired data. A trust score determined locally at a node based on the acquired data may be referred to as a "local node trust score" or a "local trust score." The nodes

19704-*x* may be configured to communicate their local trust scores among one another such that each node may have knowledge of local trust scores associated with other nodes. After a node acquires a plurality of local trust scores, the node may determine a candidate consensus trust score (hereinafter "candidate trust score") based on the plurality of local trust scores. One or more nodes may determine a consensus trust score based on the plurality of candidate trust scores. The consensus trust score may indicate a consensus value for a local trust score among a plurality of nodes. The consensus trust score for a cryptocurrency address can be written to a distributed consensus ledger and later retrieved from the trust network 19704 (e.g., in response to a trust request).

In some implementations, the consensus trust score may be determined based on an average (e.g., a blended average) of the candidate trust scores. For example, the consensus trust score may be determined by using a statistically weighted average of candidate trust scores based on count.

The trust scores described herein (e.g., local, candidate, or consensus) can be calculated/provided in a variety of formats. In some implementations, a trust score may be an integer value with a minimum and maximum value. For example, a trust score may range from 1-7, where a trust score of '1' indicates that the blockchain address is likely fraudulent. In this example, a trust score of '7' may indicate that the blockchain address is not likely fraudulent (i.e., very trustworthy). In some implementations, a trust score may be a decimal value. For example, the trust score may be a decimal value that indicates a likelihood of fraud (e.g., a percentage value from 0-100%). In some implementations, a trust score may range from a maximum negative value to a maximum positive value (e.g., −1.00 to 1.00), where a larger negative value indicates that the address is more likely fraudulent. In this example, a larger positive value may indicate that the address is more likely trustworthy. The customer may select the trust score format they prefer.

The trust network 19704 described herein distributes the trust score computational workload across a plurality of nodes to produce a resilient network that is resistant to failure/outage and attack. In some implementations, the trust network 19704 may include a built-in transactional autonomy moderated by a token that allows the trust network 197304 to distribute the computational workload. Additionally, distributing trust calculations throughout the network may provide a resistance to fraud/conspiracy intended to corrupt the network.

The transactor device 19706 is any computing device can interact with the trust network 19704. Example transactor devices may include smartphones, tablets, laptop computers, desktop computers, or other computing devices. The transactor device 19706 may include an operating system and a plurality of applications, such as a mobile application, a web browser application, a decentralized application, and additional applications.

The transactor device 19706 may include an interface for an intermediate transaction system 19708 (e.g., a web-based interface and/or an installed transaction application 19710). In certain implementations, the intermediate transaction system 19708 implemented on one or more server computing devices, may communicate with the ledger network 16970, transactor devices 19706, and the trust network 19704 and perform cryptocurrency transactions on behalf of the transactor devices 19706. The intermediate transaction system 19708 may also acquire consensus trust scores from the trust network 19704 on behalf of the transactor devices 19706. An example intermediate transaction system 19708 may include a digital currency exchange (e.g., Coinbase, Inc). In some implementations, exchanges may be decentralized.

The transaction application 19710 on transactor device 19706 may also transact with the ledger network 16970 to perform blockchain transactions. The transaction application 19710 may also request consensus trust scores from the trust network 19704. Some example transaction applications may be referred to as "wallet applications."

The transactor device 19706 can send trust requests to the trust network 19704 and receive trust responses from the trust network 19704. The trust request may indicate one or more cryptocurrency blockchain addresses for which the transactor device 19706 would like a trust report (e.g., one or more consensus trust scores). In some implementations, the trust request can include a request payment, such as a blockchain token and/or fiat currency (e.g., United States Dollars). The request payment may be distributed to nodes in the trust network 19704 as payment for providing the consensus trust score(s).

In one example, transactor device 19706 can send a trust request to the trust network 19704 and receive a trust response (e.g., trust report) from the trust network. The transactor device 19706 and the trust network 19704 may communicate via an application programming interface (API). The trust request may include a cryptocurrency blockchain address for the transactor on the other side of the transaction. For example, a trust request from a knowledge provider 16806 may request a trust report for the knowledge recipient's 21918 blockchain address. The knowledge provider 16806 may make a decision based on the received trust report, such as whether to engage in the cryptocurrency blockchain transaction with the knowledge recipient 16818.

In some implementations, the trust network 19704 may implement a fraud alert protocol that can automatically notify network participants (e.g., fraud alert requesting devices) of potentially fraudulent cryptocurrency blockchain addresses. For example, a node may include a fraud alert module configured to provide fraud alerts under a set of fraud alert criteria that may be configured by a user. In one example, the fraud alert module may monitor one or more cryptocurrency addresses and provide a fraud alert if the consensus trust score for any address drops below a threshold level of trustworthiness (e.g., as set by a user). In another example, a fraud alert may be sent if a monitored trust score changes by more than a threshold percentage. In some implementations, a fraud alert protocol may be implemented using a smart contract that monitors a consensus trust score and provides alerts according to a set of business rules that may be defined by a user.

In some implementations, the trust network 19704 may implement a reputation protocol that calculates and stores reputation values. The reputation values for a node may indicate a variety of parameters associated with the node, such as an amount of work the node performed during trust score calculations and distribution, the quality of the work performed (e.g., the accuracy), and the consistency of node operation (e.g., node uptime). The reputation values may be used by other protocols in the trust network 19704. For example, nodes may determine candidate and/or consensus trust scores based on the reputation values associated with one or more nodes. As another example, the nodes may be awarded and/or punished according to their reputation values.

In some implementations, the reputation value may be a function of the amount of work a node performs with respect to calculating trust scores. For example, the reputation value for a node may be based on the number of local trust scores calculated, the number of candidate trust scores calculated, and the amount of work related to calculating consensus trust scores. In some implementations, the reputation value may be a function of the quality of the calculations performed by the nodes. For example, the quality reputation values may be based on a number of trust score outliers produced by the nodes and how fast trust scores were produced. In some implementations, the reputation value may be a function of node parameters, such as node bandwidth, node processing power, node throughput, and node availability. Example reputation values associated with node availability may be based on uptime values, mean time between failure (MTBF) values, and/or mean time to repair (MTTR) values. In some implementations, the reputation value may be a function of the amount of data (e.g., historic data) stored at a node and the amount of time for which the data is stored. In some implementations, the reputation value may be a function of the amount staked by a node. In some implementations, the reputation value may be a composite reputation value, which may be a function of any individual reputation values described herein. For example, a composite reputation value may be a weighted calculation of one or more component reputation values.

FIG. 198 illustrates an example method that describes operation of an example trust network illustrated in FIG. 197. For example, the method of FIG. 198 illustrates the determination of local trust scores, candidate trust scores, and a consensus trust score for a single cryptocurrency blockchain address. The method of FIG. 198 may be performed multiple times to determine local trust scores, candidate trust scores, and consensus trust scores for multiple cryptocurrency blockchain addresses.

At step 19800, the nodes in the trust network 19704 acquire and process fraud and custody data associated with a cryptocurrency address. Example fraud and custody data may include data that provides evidence of fraud with respect to a cryptocurrency address and/or indicates the party that owns/controls the cryptocurrency address. At step 19802, the nodes acquire and process cryptocurrency blockchain data associated with the cryptocurrency address. Example cryptocurrency blockchain data may include data for a plurality of blockchain transactions between a plurality of different cryptocurrency addresses. At step 19804, the nodes each determine local trust scores for the cryptocurrency address based on the data acquired in blocks 19800-19802.

Different nodes may compute the same/similar local trust scores in cases where the different nodes have access to the same/similar cryptocurrency blockchain data and fraud/custody data. In some cases, the local trust scores may differ among nodes. For example, the local trust scores may differ when nodes have access to different fraud and custody data. In a specific example, nodes located in different jurisdictions (e.g., countries) may have access to data sources that are blocked in other jurisdictions. In another specific example, some nodes may access information at different rates.

At step 19806, the nodes communicate the local trust scores for the cryptocurrency address with one another. After communication of the local trust scores, each of the nodes may include a plurality of local trust scores calculated by other nodes. At step 19808, the nodes 100 determine candidate trust scores for the cryptocurrency address based on the local trust scores. The candidate trust score may for example, be determined by removing outlier local trust scores from the trust score list before determining the candidate trust score. In embodiments, the candidate trust score may be determined based on an average (e.g., a blended average) of the remaining local trust scores in the trust score list 406. For example, the candidate trust score may be determined by using a statistically weighted average of local trust scores based on node count. At step 19810, the nodes in the trust network 19704 determine a consensus trust score for the cryptocurrency address based on the candidate trust scores for the cryptocurrency addresses. The consensus trust score may be determined in response to one or more consensus triggers associated with the candidate trust scores. For example, the consensus trust score may be determined if greater than a threshold number/fraction of candidate trust scores are in agreement (e.g., within a threshold variance). In some implementations, the consensus trust score may be determined based on an average (e.g., a blended average) of the candidate trust scores. For example, the consensus trust score may be determined by using a statistically weighted average of candidate trust scores based on count. At step 19812, the nodes can update a distributed consensus trust score ledger to include the calculated consensus trust score. At step 19814, 19816, the trust network 19704 receives a trust request for the cryptocurrency address from a transactor device 19706 and sends a trust response, including the consensus trust score, to the transactor device 19706.

FIG. 199 is a diagrammatic view illustrating a transaction being processed by the ledger network 16970 including a plurality of node computing devices 16816. A knowledge provider 16806 desiring to send any digital knowledge asset to a knowledge recipient 16818 via the knowledge distribution system 16802 may send a transaction request 19902 to the knowledge distribution network 16802. In embodiments, the transaction request may include a request for determining the trustworthiness of the knowledge recipient 16818 before initiating the transaction. The knowledge distribution system 16802 may send the trust request to the trust network 19704 that determines the trust score 19904 for the address of the knowledge recipient 16818 and sends a trust response to the knowledge distribution system. Assuming the trust score for the knowledge recipient 16818 is above a given threshold, the knowledge distribution system 16802 provides the transaction request to the ledger network 1990 and the transaction is broadcast 19906 throughout the ledger network 16970 to the nodes 16816. In embodiments, each of the knowledge provider device 16890 and the knowledge recipient device 16894 may have digital wallets (associated with the ledger network 16970) that provide user interface controls and a display of transaction parameters. Depending on the ledger network 16970 parameters the nodes verify the transaction 19908 based on rules (which may be pre-defined or dynamically allocated). For example, this may include verifying identities of the parties involved, etc. The transaction may be verified immediately, or it may be placed in a queue with other transactions and the nodes 16816 determine if the transactions are valid based on a set of network rules.

In structure 19910, valid transactions are formed into a block and sealed with a hash. This process may be performed by validating nodes among the participating nodes 16816. Validating nodes may utilize additional software specifically for validating and creating blocks for the ledger network 16970. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the distributed ledger, the blocks must be validated. Validation for the ledger network 16970 may include a proof-of-work (PoW) which is a solution to a puzzle derived from the block's header. In embodiments, other protocols like proof-of-stake (PoS) or proof-of-authority (PoA) may be used for validating a block. Unlike the proof-of-work, where the algorithm rewards miners who solve mathematical problems, with the proof of stake, a creator of a new block is chosen in a deterministic way, depending on the amount of digital token assets held by the node, also defined as "stake." (The more stake a node has, the more probability that the node will be chosen as a block validator—for example, a node holding 1% of the tokens has a probability of 1% to validate a block). Then, a similar proof is performed by the selected/chosen node. If the validators are successful in validating and adding the block, proof-of-stake, in embodiments, will award successful validators with a fee in proportion to their stake. Proof of Authority (PoA) on the other hand, leverages "authority" or "trust," which means that block validators are not staking tokens/coins but their own reputation instead. Therefore, PoA blockchains are secured by the validating nodes that are arbitrarily selected as "trustworthy" entities. PoA consensus does not require the nodes to spend vast amount of resources to compete with each other and has good energy efficiency, low network bandwidth usage and high throughput.

With validating 19912 with PoW, nodes try to solve the block by making incremental changes to one variable until the solution satisfies a network-wide target. This creates the PoW thereby ensuring correct answers. Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases.

With validating 19912 with PoS, instead of investing in energy in a race to solve or mine blocks, a 'validator' invests in tokens or coins of the system. This consensus is more energy efficient and, the fact that miners do not have to solve a hard puzzle, allow higher throughputs.

With validating 19912 with PoA, a set of trusted nodes in the networks are chosen as validators. For example, a group of known and reputable nodes may be chosen or authorized by network administrators or voted by the network. Only validators are entitled to validate the next block, and this validator is chosen randomly in a way that the same validator cannot validate two blocks consecutively. A validator node that is caught trying to forge the system may be removed from the validators pool.

In some implementations, the "authority" of a node may be a function of its consensus trust score and reputation as determined by the trust network 19704.

While proof of work (PoW), proof of stake (POS) and proof of authority (PoA) are described herein as consensus protocols for validating blocks, these are merely a few example consensus algorithms and are not intended to be limiting. It will be understood that many different consensus protocols may be implemented for the orchestration of transactions, and the synchronization and validation of data in the ledger network 16970. The consensus protocol may be a protocol where nodes 16816 come to an agreement on data that may be written to the distributed ledger, so that all nodes in the ledger network 16970 agree on the data- or state-comprising the ledger. In other words, the consensus protocol may operate to keep all nodes on the ledger network 16970 synchronized with each other, in terms of the state of the ledger network 16970. Some examples of consensus protocols that may be utilized for validation include, without limitation, Delegated Proof of Stake (DPOS), Proof of Reputation (POR), Proof of Burn (PoB), Proof of Elapsed Time (PoET), Proof of Space, Proof of Weight, Practical Byzantine Fault Tolerance (PBFT), Delegated Byzantine Fault Tolerance (DBFT), Federated Byzantine Fault Tolerance (FBFT), Paxos, Raft, Tendermint, directed acyclic graph (DAG), or a hybrid of two or more of the aforementioned consensus protocols.

With distribution 19914, the successfully validated block is distributed through the ledger network 16970 and all nodes 16816 add the block to a majority chain which is the ledger network's 16970 auditable ledger. Furthermore, the value in the transaction submitted by the knowledge provider device 16890 is confirmed with 19916 (deposited or otherwise transferred to the digital wallet of the knowledge recipient device 16894).

FIG. 200 is a diagrammatic view illustrating an example implementation of the knowledge distribution system including the digital marketplace 16856 configured to provide an environment allowing knowledge providers 16806 and knowledge recipients 16818 to engage in commerce relating to the transfer of digital knowledge. A set of crowdsourcers 16836, 20002, 20004, 20006, and 20018 with their respective devices 16892, 20008, 20010, 20012 and 20014 may help facilitate such transactions and commerce between the knowledge provider 16806 and the knowledge recipient 16818.

The digital marketplace 16856 may provide an interface for all the users of the knowledge distribution system including knowledge providers 16806, knowledge recipients 16818, crowdsources 16836, 20002, 20004, 20006 and third parties to perform one or more suitable marketplace interactions with the digital knowledge 16804. For example, the users may create a public profile for other users to see, interact with other users, transact for one or more pieces of the digital knowledge 16804 (e.g., buy, sell, license, lease, bid on, and/or give away the digital knowledge), verify source information and/or other information related to one or more pieces of the digital knowledge 16804, review or provide one or more services related to one or more pieces of the digital knowledge 16804.

In embodiments, the digital knowledge 16804 may include intellectual property (e.g., patents, trade secrets, copyrights, trademarks, designs, know how, privacy rights, publicity rights, and others) and the knowledge distribution system 16802 helps perform and facilitate the recordation, collaboration, licensing and tracking of information regarding such intellectual property. The knowledge distribution system 16802 may thus provide a platform that can be utilized by all users for recordings, buying, selling, or licensing transactions and payments, tracking and reputation management. In such embodiments, the knowledge provider 16806 may be the owner of the intellectual property (IP) and the knowledge recipient 16818 may be the licensee of the intellectual property. The crowdsourcer 16836 may be an IP attorney, crowdsourcer 20002 may be a domain expert (e.g. an expert in cognitive radio to assess IP or patents related to dynamic spectrum sharing), crowdsourcers 20004 and 20006 may be experts in IP valuation. Some other examples of crowdsourcers may include inventors, technology developers, patent law firms, patent offices, IP service providers, writers, litigators, or other experts in technology, law, or finance. The parties to the transaction i.e., the knowledge provider 16806 and the knowledge recipient 16818 may employ the services of one or more the crowdsourcers to facilitate such transaction of IP.

In embodiments, the trust network 19704 provides trust scores to various nodes including knowledge providers 16806, knowledge recipients 16818, crowdsources 16836, 20002, 20004 and 20006. The trust scores enable various parties to decide which parties to transact with. For example, a knowledge providers 16806 may choose one or more knowledge recipients 16818 as well as one or more crowdsourcers based on their trust scores.

FIG. 201 is a diagrammatic view illustrating an example user interface of digital marketplace 16856 configured to enable transactions and commerce between various users of the knowledge distribution system 16802. User interface 20100 may be a web interface allowing an owner of an intellectual property to offer the intellectual property for licensing in the form of a non-fungible token (NFT) signifying some percentage of ownership rights associated with the intellectual property. In the example, the intellectual property is a US patent application. The owner of the patent application ABC LLC may create a profile 20102 and provide a wallet 20104 address to be able to offer the patent application for licensing in the digital marketplace 16856. The wallet 20104 may enable users of the knowledge distribution system 16802 like owner ABC LLC transact with other users like potential licensees or crowdsourcers. The owner may also upload an image of the front page of the patent application including the patent number, title, abstract, and one or more figures. The digital marketplace may provide additional details about the NFT and the underlying IP on which the NFT is based. Such details may include a description 20106 of the IP, underlying blockchain 20108, contract address 20110, price history 20112 of the NFT, trading history 20114 of the NFT, smart contract 16840 details including full license 20140 terms of the NFT licensing contract, and the like. Additionally, any user of the digital marketplace may view the profile of the owner to view the trust score that may help a user in deciding if they wish to transact with the owner to buy or license the IP NFT. In embodiments, potential licensees may be provided with a 'place bid' button 20116, clicking on which they may place one or bids for an NFT. Once a potential licensee has provided a winning bid based on the terms of the auction, and transferred the proceeds, the smart contract 16840 may get triggered to transfer the ownership of the NFT to the winning bidder and record the transaction on the blockchain. The smart contract 16840 may thus provide liquidity and efficiency to an otherwise illiquid and opaque market of digital knowledge assets by enabling quick and transparent transactions on the blockchain.

In embodiments, the digital marketplace 16856 may provide a search interface 20118 to enable a user to search for one or more pieces of digital knowledge 16804 (say tokenized as an NFT). A filter 20120 may provide users with a quick and easy way to navigate the digital marketplace 16856 and find products they are interested in. In embodiments, the filter 20120 may provide the user with a dropdown menu with various NFT categories available for licensing on the digital marketplace 16856. For example, the users may be able to look for NFTs for various digital knowledge assets including intellectual property (e.g., patents, trade secrets, copyrights, trademarks, designs, know how, privacy rights, publicity rights, and others), instruction sets (e.g., 3D printing, semiconductor fabrication, process steps for crystal fabrication, polymer production, biological production chemical synthesis, food production, manufacturing, transportation) software codes (e.g., executable algorithmic logic such as computer programs, firmware programs, serverless code logic, AI logic and/or definitions, machine learning logic and/or definitions, cryptography logic), data sets and the like.

Referring to FIG. 175, knowledge distribution system 17500 for controlling rights related to digital knowledge is depicted. The knowledge distribution system 17500 may include an input system 17802, a tokenization system 17812, a ledger management system 17818, and a smart contract system 17824. In some embodiments the knowledge distribution system 17500 may further include a smart contract generator 17858, an execution system 17510, a reporting system 17514, and a crowdsourcing module 17516.

The input system 17802 receives digital knowledge 17808 from a user 17502 and the tokenization system 17812 may tokenize the received digital knowledge 17808 resulting in a token/tokenized digital knowledge 17814 that is manipulable as a token.

The ledger management system 17818 creates and manages one or more distributed ledgers 17820, where a distributed ledger may include a plurality of cryptographically linked blocks distributed over a plurality of nodes of a network 17848 as described elsewhere herein. The ledger management system 17818 may then store a smart contract(s) 17822 and the tokenized digital knowledge 17814 in a distributed ledger 17820 (FIG. 188).

A smart contract system 17824 may implement and manage a smart contract 17822 which may include the tokenized digital knowledge 17814, a triggering event 17828, and a smart contract action 17830. Upon occurrence of a triggering event 17828, the smart contract system 17824 may perform the smart contract action 17830. The smart contract system 17824 may process commitment(s) 17832 of parties 17532 to the smart contract 17822. The smart contract system 17824 may manage rights 17540 including control rights 17840 over the tokenized digital knowledge 17814 and access rights 17842 regarding who can view, edit, access, or use the tokenized digital knowledge 17814. The smart contract 17822 further comprises a smart contract wrapper 17503. The knowledge distribution system 17500 further comprises an account management system 17505, a user interface system 17507, and a marketplace system 17509.

As depicted in FIG. 180, the tokenized digital knowledge 17814 may include executable algorithmic logic 18002, a 3D printer instruction set 18004, an instruction set for a coating process 18008, an instructions set for a semiconductor fabrication process 18010, a firmware program 18012, an instruction set for a field-programmable gate array (FPGA) 18014, serverless code logic 18018, an instructions set for a crystal fabrication system 18020, an instruction set for a food preparation process 18022, an instruction set for a polymer production process 18024, an instruction set for a biological production process 18030, a data set for a digital twin 18032, an instruction set to perform a trade secret 18034, intellectual property 18038, an instruction set 18040, or the like. In embodiments, where the tokenized digital knowledge 17814 includes intellectual property 18038, the smart contract system 17824 may embed intellectual property licensing term(s) 18802 for the intellectual property 18038 in the distributed ledger and, in response to a triggering event 17828, update the access rights 17842 to provide access to the intellectual property 18038 or process a commitment 17832 of a party 17532 to the smart contract 17822 and the corresponding intellectual property licensing term(s) 18802.

In embodiments, the smart contract 17822 may include a smart contract wrapper 17503 which may add intellectual property 18038 to a stack of intellectual property which may be on the distributed ledger 17820 and commitment 17832 by one or more parties 17532 to: an apportionment of royalties for the added intellectual property 18804. The smart contract wrapper 17503 may record, in a distributed ledger, a commitment 17832 by one or more parties 17532 to: an apportionment of royalties for the aggregate stack of intellectual property 18804, or a contract term 18810.

In embodiments, the ledger management system 17818 may include a logging system 17512 to store logged data in the distributed ledger 17820. In embodiments, the digital knowledge 17808 may be an instruction set and the ledger management system 17818 may provide provable access to the instruction set and execute the instruction set on a system. Providing provable access may include logging or recording data in at least one of the plurality of cryptographically linked blocks. Provable access may include: aggregating views of a trade secret into a chain that records which knowledge recipients have viewed the trade secret 18814 on the distributed ledger; recording a party who has contributed to the digital knowledge, by logging data related to the party, logging access transactions to an instance of digital knowledge 18830; recording, a source of an instance of the digital information by storing data related to the source, The knowledge distribution system 17500 may include a reporting system 17514 to report analytic data or an analytic response(s) 18834 based on a plurality of operations performed on the distributed ledger, or on the tokenized digital knowledge. The reporting system 17514 may also analyzed the tokenized digital knowledge 17814 and report the analytic result 18832.

In an embodiment, the smart contract system 17824 may aggregate a set of instructions into an instructions set 18040, add an instruction to pre-existing instructions set to provide a modified instruction set 18040, manage allocation of instruction subsets 18042 to the distributed ledger, manage access to the instruction to the instruction sets based on access rights 17842, or the like.

In embodiments, the ledger management system 17818 may include a crowdsourcing module 17516 to obtain crowdsourced information 18602 which may then be stored in the distributed ledger. crowdsourced information 18602 may include: a review of an instance of the digital knowledge 18824, a signature related to an instance of crowdsourced information 18826, a verification of an instance of the digital knowledge 18828, and the like.

In embodiments, the knowledge distribution system 17500 may include a private network system to enable a private network and allow authorized parties to establish a cryptography-based consensus requirement for verification of new cryptographically linked blocks to be added to the plurality of cryptographically linked block. In embodiments, the ledger management may establish cryptocurrency tokens designed to be tradeable among users of the distributed ledger.

In embodiments, the knowledge distribution system 17500 may include an account management system 17505 to facilitate creation and management of a plurality of user accounts 19094 corresponding to a plurality of users 17502, 19004 of a knowledge distribution system 17500. The user account data may be stored on the distributed ledger.

In embodiments, the knowledge distribution system may include a user interface system 17507, 19074 to present a user interface 19093 to a user(s) 17502, 19004 which enables the user to view data related to an instance of the digital knowledge.

In embodiments, the knowledge distribution system may include a marketplace system 17509 to establish and maintain a digital marketplace 19090 and visually present data corresponding to an instance of the digital knowledge to a user of the knowledge distribution system.

In embodiments, the knowledge distribution system may include a datastore in communication with the distributed ledger where the datastore may include a knowledge datastore configured to store data related to the digital knowledge, client datastore is configured to store data related to a plurality of users of the knowledge distribution system, smart contract datastore is configured to store data related to the smart contract, and the like.

In embodiments, the knowledge distribution system 17500 may include a smart contract generator 17858 to generate a smart contract using a parameterizable smart contract template. Smart contract parameters may be based on a type of digital knowledge to be tokenized and may include a financial parameter, a royalty parameter, a usage parameter, an output produced parameter, an allocation of consideration parameter, an identity parameter, an access condition parameter, or the like.

Referring to FIG. 176, a computer-implemented method for controlling rights related to digital knowledge is depicted. In embodiments, a distributed ledger is created and managed (Step 17602) where the distributed ledger may include a plurality of blocks linked via cryptography distributed over a plurality of nodes of a network as shown elsewhere herein. A smart contact may be implemented and managed (step 17604). A smart contract may include a triggering event, a corresponding smart contract action, and the like. The smart contract may be stored on the distributed ledger. An instance of digital knowledge may be received (step 17608) The digital knowledge may be tokenized (step 17610) and the resulting tokenized digital knowledge stored via the distributed ledger (step 17612). Commitments of a plurality of parties to the smart contract may be processed (step 17614) and rights of control or and access to the tokenized digital knowledge may be managed according to the smart contract (step 17618). In response to an occurrence of the triggering event, the corresponding smart contract action may be performed with respect to the tokenized digital knowledge (step 17620).

Referring to FIG. 177, an embodiment of a computer-implemented method for controlling rights related to digital knowledge is depicted. The computer-implemented method may further include orchestrating, based on the smart contract, an exchange of new digital knowledge for the tokenized digital knowledge (step 17702). The method may also include integrating the knowledge exchange with a separate exchange, wherein the knowledge exchange facilitates an exchange of at least one of valuable and sensitive knowledge related to a subject matter of the separate exchange (step 17704).

Referring to FIG. 178, a knowledge distribution system 17800 for controlling rights related to digital knowledge is depicted. In embodiments, the knowledge distribution system 17800 may include an input system 17802, a tokenization system 17812, a ledger management system 17818, a smart contract system 17824, an event monitoring module 17850, and a smart contract generator 17858. The input system 17802 receives information 17862 and digital knowledge 17808 from a knowledge provider device 17804 and the tokenization system 17812 may tokenize the digital knowledge 17808 resulting in a token/tokenized digital knowledge 17814 that is manipulable as a token.

As depicted in FIG. 180, the tokenized digital knowledge 17814 may include executable algorithmic logic 18002, a 3D printer instruction set 18004, an instruction set for a coating process 18008, an instructions set for a semiconductor fabrication process 18010, a firmware program 18012, an instruction set for a field-programmable gate array (FPGA) 18014, serverless code logic 18018, an instructions set for a crystal fabrication system 18020, an instruction set for a food preparation process 18022, an instruction set for a polymer production process 18024, an instruction set for a biological production process 18030, a data set for a digital twin 18032, an instruction set to perform a trade secret 18034, intellectual property 18038, an instruction set 18040, and the like.

In some embodiments, the digital knowledge may include a 3D printer instruction set for 3D printing an object such as a custom part, a custom product, a manufacturing part, a replacement part, a toy, a medical device, a tool, or the like. As depicted in FIG. 179, the 3D printer instruction set for 3D printing an object 17810 may include a 3D printing schematic 17902, an origin 17904, a date of creation 17908, a name of a contributing individual 17910, name of a contributing group 17912, name of a contributing company 17914, a price 17918, a market trend for a related schematic 17920, a serial number 17922, a part identifier 17924, or the like.

The ledger management system 17818 creates and manages one or more distributed ledgers 17820, where a distributed ledger may include a plurality of a series of cryptographically linked blocks distributed over a plurality of nodes of a network 17848 as described elsewhere herein. The ledger management system 17818 may then store smart contracts 17822 and the tokenized digital knowledge 17814 in a distributed ledger 17820.

The smart contract system 17824 may implement and manage a smart contract 17822 where the smart contract 17822 may include one or more triggering events 17828 and corresponding smart contract actions 17830. The smart contract system may manage rights 17861, such as control rights 17840 and access rights 17842, to the tokenized digital knowledge 17814 according to the smart contract 17822. The smart contract system may process commitments of the knowledge provider 17834 and a knowledge recipient 17838 of the 3D printer instruction set for 3D printing an object 17810.

In response to an occurrence of a triggering event 17828, the smart contract system 17824 may perform the corresponding smart contract action 17830 and manage the smart contract action 17830 according to a condition 17844 and the triggering event 17828. The triggering event may be a transfer of the 3D printer instructions or use of the 3D printer instructions and the smart contract action may, based on control rights 17840 and access rights 17842, modify on the distributed ledger, when the 3D printer instruction set is purchased, downloaded, or used. As depicted in FIG. 181, a smart contract action 17830 may include: assigning a serial number to the object that is 3D printed 18108, monitoring for the triggering event 18110, verifying fulfillment of an obligation based on the condition 18112, verifying payment or transfer of the tokenized digital knowledge 18114, logging one or more transactions in the distributed ledger 18118, transferring the tokenized digital knowledge, performing one or more operations with respect to the distributed ledger 18120, creating new or more new blocks in the distributed ledger 18122, verifying that the condition is met 18124, generating a payment request of the knowledge recipient 18128, modifying on the distributed ledger when the 3D printer instruction set is purchased, downloaded, or used 18130, or the like. A smart contract action 17830 may include: receiving a purchase request from a knowledge recipient device 18102, fulfilling a purchase request from a knowledge recipient device 18104, verifying that the conditions is met when the condition is a printer requirement, a payment received, a currency transferred from a knowledge recipient device or the knowledge recipient, a transfer of the tokenized digital knowledge to the knowledge recipient device, and the like. As depicted in FIG. 182, a condition 17844 may include a printer requirement 18202, a payment received 18204, a currency transferred from a knowledge recipient or knowledge recipient device 18208, a transfer of the tokenized digital knowledge to the knowledge recipient or knowledge recipient device 18210, or the like.

Referring to FIG. 183, possible rights 17861 of control of and access to the tokenized digital knowledge may include at least one of permission for a user to 3D print using multiple instances of the 3D printer instruction set 18302, a 3D printer requirement 18304, a time period during which the object can be 3D printed 18308, whether the tokenized digital knowledge is transferred to a downstream knowledge recipient 18310, warranty 18312, disclaimer 18314, indemnification 18318, or certification with respect to the object 18320.

Referring to FIG. 184, possible triggering events 17828 may include transfer of the 3D printer instructions 18402 or us of the 3D printer instructions 18404.

Referring to FIG. 185, a computer-implemented method 18500 for controlling rights related to digital knowledge is depicted. In embodiments, the method may include creating and managing a distributed ledger, wherein the distributed ledger comprises a plurality of blocks linked via cryptography distributed over a plurality of nodes of a network (step 18502). A smart contract may be implemented and subsequently managed (step 18502). The smart contract may include a triggering event and be stored in the distributed ledger. In response to an occurrence of the triggering event, a smart contract action may be performed with respect to the digital knowledge (step 18506). The method 18500 may further include receiving, from a knowledge provider device, an instance of the digital knowledge that comprises a three-dimensional (3D) printer instruction set for 3D printing an object (step 18508), tokenizing the digital knowledge (step 18510), and storing the tokenized digital knowledge via the distributed ledger (step 18512). The method 18500 may further include processing commitments of the knowledge provider and a knowledge recipient of the 3D printer instruction set to the smart contract (step 18514), managing, according to the smart contract, rights of control of and access to the tokenized digital knowledge (step 18516), and managing the smart contract action according to a condition and the triggering event (step 18518).

In embodiments, and with reference to FIG. 186 through FIG. 188, a computer-implemented method 18600 for controlling rights related to digital knowledge is depicted. The computer-implemented method 18600 may include crowdsourcing information regarding the digital knowledge (step 18602) where the crowdsourced information may include: an element of the instance of the digital knowledge 18702, information regarding an element of the instance of the digital knowledge 18704, information regarding the knowledge provider 18708, information regarding the knowledge recipient 18710, and the like. The computer-implemented method 18600 may further include updating the smart contract in response to the crowdsourced information (step 18604) or updating a condition (step 18608).

With reference to FIG. 190, a knowledge distribution system 19000 for controlling rights related to digital knowledge is depicted. In embodiments, the knowledge distribution system 19000 may include an input system 19002, a tokenization system 19012, a ledger management system 19018, and a smart contract system 19024. The input system 19002 receives digital knowledge 19008 and the tokenization system 19012 may tokenize the digital knowledge 19008 resulting in a tokenized digital knowledge 19014 that is manipulable as a token.

The ledger management system 19018 may create and manage a distributed ledgers 19020, where the distributed ledger may include a plurality of cryptographically linked blocks distributed over a plurality of nodes of a network as described elsewhere herein. The ledger management system 19018 may store a smart contract(s) 19022 and the tokenized digital knowledge 19014 in a distributed ledger 19020. The ledger management system 19018 may provide provable access to the digital knowledge 19008 by recording and storing access transactions 19048 in the distributed ledger. Other methods of providing provable access are described elsewhere herein.

A smart contract system 19024 may implement and manage a smart contract 1902 which may include the tokenized digital knowledge 19014, and a triggering event 19028. Upon occurrence of a triggering event 19028, the smart contract system 19024 may perform a smart 19062 including rights of control 19040 over the tokenized digital knowledge 19014 and rights of access 19042 regarding who can view, edit, access, or use the digital knowledge 19008. The smart contract 19022 may process commitments 19032 of parties to the smart contract 19034.

In embodiments, the smart contract 19022 may include a smart contract wrapper 19064 which may perform an operation on the distributed ledger to: add intellectual property 18038, add intellectual property 18038 to a stack of intellectual property, add commitment 17832 by one or more parties 17532 to: an apportionment of royalties for the added intellectual property 18804.

In embodiments, the knowledge distribution system 19000 may include an account management system 19072, in communication with a distributed ledger, to facilitate creation and management of a plurality of user accounts 19094 corresponding to a plurality of users 19004 of a knowledge distribution system 19500. The knowledge distribution system 19000 may include a user interface system 19074 to present a user interface 19093 to a user(s) 19004 which enables the user to view data related to an instance of the digital knowledge 19008.

In embodiments, the knowledge distribution system 19000 may include a marketplace system 19078 to establish and maintain a digital marketplace 19090 and visually present data corresponding to an instance of the digital knowledge 19008 to a user 19004 of the knowledge distribution system 19000.

In embodiments, the knowledge distribution system 19000 may include a datastore in communication with the distributed ledger where the datastore may include a knowledge datastore 19082 configured to store data related to the digital knowledge 19008, client datastore 19084 configured to store data related to a plurality of users 19004 of the knowledge distribution system, smart contract datastore 17164 configured to store data related to the smart contract 19022, and the like.

The knowledge distribution system 19000 may include a reporting system 19080 analyze the tokenized digital knowledge 19014 and report the analytic result 19098.

In embodiments, the knowledge distribution system 19000 may include a smart contract generator 19088 to generate a smart contract 19022 using a parameterizable smart contract template 19060. Referring to FIG. 189, smart contract parameters 17522 may be based on a type of digital knowledge to be tokenized and may include a financial parameter 18902, a royalty parameter 18904, a usage parameter 18906, and output produced parameter 18908, and allocation of consideration parameter 18910, an identity parameter 18912, an access condition parameter 18914, or the like With reference to FIG. 191, an illustrative and non-limiting example method for controlling rights related to digital knowledge is depicted. The method may include creating and managing a distributed ledger 19102, wherein the distributed ledger comprises a plurality of blocks linked via cryptography distributed over a plurality of nodes of a network; tokenizing the digital knowledge 19104; storing the tokenized digital knowledge via the distributed ledger 19108; implementing and managing a smart contract 19110, wherein the smart contract comprises a triggering event, the tokenized knowledge, and a corresponding smart contract action and is stored in the distributed ledger; receiving an instance of the digital knowledge 19112; processing commitments of a plurality of parties to the smart contract 19114; managing, according to the smart contract, rights of control of and access to the tokenized digital knowledge 19118; performing, in response to an occurrence of the triggering event, the corresponding smart contract action with respect to the tokenized digital knowledge 19120; and managing the smart contract action in response to the triggering event 19122. In some embodiments, and with reference to FIG. 192, the method may further include crowdsourcing information regarding an element of the instance of the digital knowledge 19224 and updating the smart contract in response to the crowdsourced information 19228. In some embodiments, and with reference to FIG. 193, the method may further include adding intellectual property to the distributed ledger 19324, committing parties to an apportionment of royalties for the added intellectual property 19328, and processing a commitment of a party to a contract term 19330. In some embodiments, and with reference to FIG. 194, the method may further include creating a user account 19424, receiving a request from a user account to display data related to an instance of the digital knowledge 19428, confirming access to the instance of the digital knowledge allowed for the user account 19430, and presenting a user interface configured to display the data related to an instance of the digital knowledge 19432. In some embodiments, and with reference to FIG. 195, the method may further include buying or selling the digital knowledge 19524. In some embodiments, and with reference to FIG. 196, the method may further include creating and issuing a currency token associated with the distributed ledger 19624.

With reference to FIG. 190, a knowledge distribution system 19000 for controlling rights related to digital knowledge is depicted. In embodiments, the knowledge distribution system 19000 may include an input system 19002, a tokenization system 19012, a ledger management system 19018, and a smart contract system 19024. The input system 19002 receives digital knowledge 19008 and the tokenization system 19012 may tokenize the digital knowledge 19008 resulting in a tokenized digital knowledge 19014 that is manipulable as a token.

The ledger management system 19018 may create and manage a distributed ledgers 19020, where the distributed ledger may include a plurality of cryptographically linked blocks distributed over a plurality of nodes of a network as described elsewhere herein. The ledger management system 19018 may store a smart contract(s) 19022 and the tokenized digital knowledge 19014 in a distributed ledger 19020. The ledger management system 19018 may provide provable access to the digital knowledge 19008 by recording and storing access transactions 19048 in the distributed ledger. Other methods of providing provable access are described elsewhere herein.

A smart contract system 19024 may implement and manage a smart contract 1902 which may include the tokenized digital knowledge 19014, and a triggering event 19028. Upon occurrence of a triggering event 19028, the smart contract system 19024 may perform a smart 19062 including rights of control 19040 over the tokenized digital knowledge 19014 and rights of access 19042 regarding who can view, edit, access, or use the digital knowledge 19008. The smart contract 19022 may process commitments 19032 of parties to the smart contract 19034.

In embodiments, the smart contract 19022 may include a smart contract wrapper 19064 which may perform an operation on the distributed ledger to: add intellectual property 18038, add intellectual property 18038 to a stack of intellectual property, add commitment 17832 by one or more parties 17532 to: an apportionment of royalties for the added intellectual property 18804.

In embodiments, the knowledge distribution system 19000 may include an account management system 19072, in communication with a distributed ledger, to facilitate creation and management of a plurality of user accounts 19094 corresponding to a plurality of users 19004 of a knowledge distribution system 19500. The knowledge distribution system 19000 may include a user interface system 19074 to present a user interface 19093 to a user(s) 19004 which enables the user to view data related to an instance of the digital knowledge 19008.

In embodiments, the knowledge distribution system 19000 may include a marketplace system 19078 to establish and maintain a digital marketplace 19090 and visually present data corresponding to an instance of the digital knowledge 19008 to a user 19004 of the knowledge distribution system 19000.

In embodiments, the knowledge distribution system 19000 may include a datastore in communication with the distributed ledger where the datastore may include a knowledge datastore 19082 configured to store data related to the digital knowledge 19008, client datastore 19084 configured to store data related to a plurality of users 19004 of the knowledge distribution system, smart contract datastore 17164 configured to store data related to the smart contract 19022, and the like.

The knowledge distribution system 19000 may include a reporting system 19080 analyze the tokenized digital knowledge 19014 and report the analytic result 19098.

In embodiments, the knowledge distribution system 19000 may include a smart contract generator 19088 to generate a smart contract 19022 using a parameterizable smart contract template 19060. Smart contract parameters may be based on a type of digital knowledge to be tokenized and may include a financial parameter, a royalty parameter, a usage parameter, and output produced parameter, and allocation of consideration parameter, an identity parameter, an access condition parameter, or the like Workflow Management Systems In embodiments, the workflow management system may support various workflows associated with a facility, such as including interfaces of the platform by which a facility manager may review various analytic results, status information, and the like. In embodiments, the workflow management system tracks the operation of a post-action follow-up module to ensure that the correct follow-up messages are automatically, or under control of a facility agent using the platform, sent to appropriate individuals, systems and/or services.

In the various embodiments, various elements are included for a workflow for each of an energy project, a compute project (e.g., cryptocurrency and/or AI) and hybrids. In embodiments, provided herein is an information technology system for providing data to an intelligent energy and compute facility resource management system having a system for learning on a training set of facility outcomes, facility parameters, and data collected from data sources to train an artificial intelligence/machine learning system to at least one of predict a likelihood of a facility production outcome, predict a facility production outcome, optimize provisioning and allocation of energy and compute resources to produce a favorable facility resource utilization profile among a set of available profiles, optimize provisioning and allocation of energy and compute resources to produce a favorable facility resource output selection among a set of available outputs, optimize requisition and provisioning of available energy and compute resources to produce a favorable facility input resource profile among a set of available profiles, optimize configuration of available energy and compute resources to produce a favorable facility resource configuration profile among a set of available profiles, optimize selection and configuration of an artificial intelligence system to produce a favorable facility output profile among a set of available artificial intelligence systems and configurations, or generate an indication that a current or prospective customer should be contacted about an output that can be provided by the facility.

Management Application Platform

Figure 33:
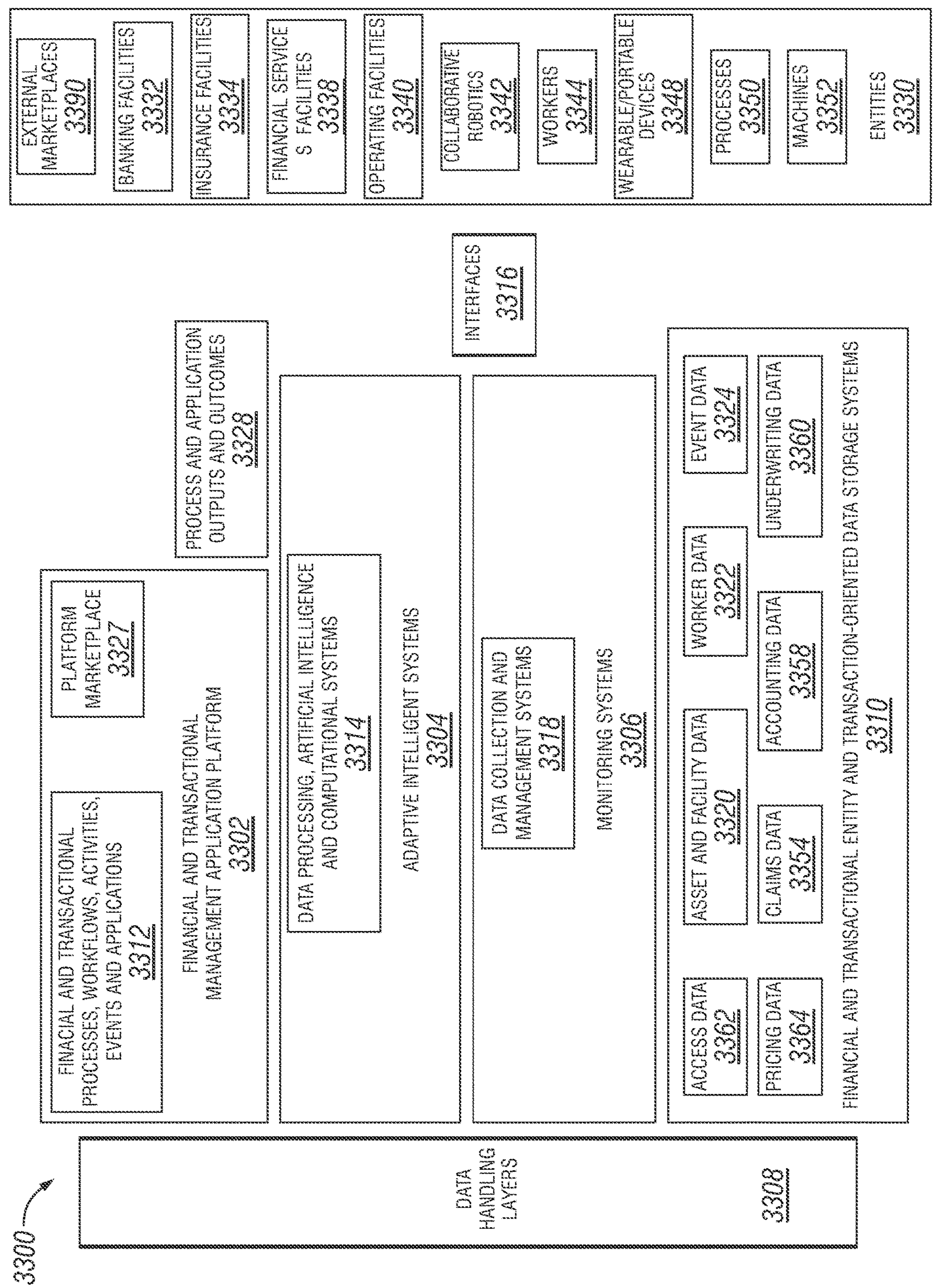
FIG. 33 depicts components and interactions of a transactional, financial and marketplace enablement system.

Referring to FIG. 33, a transactional, financial and marketplace enablement system 3300 is illustrated, including a set of systems, applications, processes, modules, services, layers, devices, components, machines, products, sub-systems, interfaces, connections, and other elements working in coordination to enable intelligent management of a set of financial and transactional entities 3330 that may occur, operate, transact or the like within, or own, operate, support or enable, one or more platform-operated marketplaces 3327 or external marketplaces 3390 or that may otherwise be part of, integrated with, linked to, or operated on by the platform 3300. Platform-operated marketplaces 3327 and external marketplaces 3390 may include a wide variety of marketplaces and exchanges for physical goods, services, virtual goods, digital content, advertising, credits (such as renewable energy credits, pollution abatement credits and the like), currencies, commodities, cryptocurrencies, loyalty points, physical resources, human resources, attention resources, information technology resources, storage resources, energy resources, options, futures, derivatives, securities, rights of access, tickets, licenses (including seat licenses, private or government-issued licenses or permissions to undertake regulated activities, medallions, badges and others), and many others. Financial and transactional entities 3330 may include any of the wide variety of assets, systems, devices, machines, facilities, individuals or other entities mentioned throughout this disclosure or in the documents incorporated herein by reference, such as, without limitation: financial machines 3352 and their components (e.g., automated teller machines, point of sale machines, vending machines, kiosks, smart-card-enabled machines, and many others); financial and transactional processes 3350 (such as lending processes, software processes (including applications, programs, services, and others), production processes, banking processes (e.g., lending processes, underwriting processes, investing processes, and many others), financial service processes, diagnostic processes, security processes, safety processes and many others); wearable and portable devices 3348 (such as mobile phones, tablets, dedicated portable devices for financial applications, data collectors (including mobile data collectors), sensor-based devices, watches, glasses, hearables, head-worn devices, clothing-integrated devices, arm bands, bracelets, neck-worn devices, AR/VR devices, headphones, and many others); workers 3344 (such as banking workers, financial service personnel, managers, engineers, floor managers, vault workers, inspectors, delivery personnel, currency handling workers, process supervisors, security personnel, safety personnel and many others); robotic systems 3342 (e.g., physical robots, collaborative robots (e.g., "cobots"), software bots and others); and operating facilities 3340 (such as currency production facilities, storage facilities, vaults, bank branches, office buildings, banking facilities, financial services facilities, cryptocurrency mining facilities, data centers, trading floors, high frequency trading operations, and many others), which may include, without limitation, among many others, storage and financial services facilities 3338 (such as for financial services inventory, components, packaging materials, goods, products, machinery, equipment, and other items); insurance facilities 3334 (such as branches, offices, storage facilities, data centers, underwriting operations and others); and banking facilities 3332 (such as for commercial banking, investing, consumer banking, lending and many other banking activities).

In embodiments, the transactional, financial and marketplace enablement system 3300 may include a set of data handling layers 3308 each of which is configured to provide a set of capabilities that facilitate development and deployment of intelligence, such as for facilitating automation, machine learning, applications of artificial intelligence, intelligent transactions, state management, event management, process management, and many others, for a wide variety of financial and transactional applications and end uses. In embodiments, the data handling layers 3308 include a financial and transactional monitoring systems layer 3306, a financial and transactional entity-oriented data storage systems layer 3310 (referred to in some cases herein for convenience simply as a data storage layer 3310), an adaptive intelligent systems layer 3304 and a financial and transactional management application platform layer 3302. Each of the data handling layers 3308 may include a variety of services, programs, applications, workflows, systems, components, and modules, as further described herein and in the documents incorporated herein by reference. In embodiments, each of the data handling layers 3308 (and optionally the transactional, financial and marketplace enablement system 3300 as a whole) is configured such that one or more of its elements can be accessed as a service by other layers 3308 or by other systems (e.g., being configured as a platform-as-a-service deployed on a set of cloud infrastructure components in a microservices architecture). For example, a data handling layer 3308 may have a set of application programming interfaces 3316, such as application programming interfaces (APIs), brokers, services, connectors, wired or wireless communication links, ports, human-accessible interfaces, software interfaces or the like by which data may be exchanged between the data handling layer 3308 and other layers, systems or sub-systems of the platform 3300, as well as with other systems, such as financial entities 3330 or external systems, such as cloud-based or on-premises enterprise systems (e.g., accounting systems, resource management systems, CRM systems, supply chain management systems and many others. Each of the data handling layers 3308 may include a set of services (e.g., microservices), for data handling, including facilities for data extraction, transformation and loading; data cleansing and deduplication facilities; data normalization facilities; data synchronization facilities; data security facilities; computational facilities (e.g., for performing pre-defined calculation operations on data streams and providing an output stream); compression and de-compression facilities; analytic facilities (such as providing automated production of data visualizations) and others.

In embodiments, each data handling layer 3308 has a set of application programming interfaces 3316 for automating data exchange with each of the other data handling layers 3308. These may include data integration capabilities, such as for extracting, transforming, loading, normalizing, compression, decompressing, encoding, decoding, and otherwise processing data packets, signals, and other information as it exchanged among the layers and/or the applications 3312, such as transforming data from one format or protocol to another as needed in order for one layer to consume output from another. In embodiments, the data handling layers 3308 are configured in a topology that facilitates shared data collection and distribution across multiple applications and uses within the transactional, financial and marketplace enablement system 3300 by the financial and transactional monitoring systems layer 3306. The financial and transactional monitoring systems layer 3306 may include, integrate with, and/or cooperate with various data collection and management systems 3318, referred to for convenience in some cases as data collection systems 3318, for collecting and organizing data collected from or about financial and transactional entities 3330, as well as data collected from or about the various data handling layers 3308 or services or components thereof. For example, a stream of physiological data from a wearable device worn by a worker undertaking a task or a consumer engaged in an activity can be distributed via the monitoring systems layer 3306 to multiple distinct applications in the financial and transactional management application platform layer 3302, such as one that facilitates monitoring the physiological, psychological, performance level, attention, or other state of a worker and another that facilitates operational efficiency and/or effectiveness. In embodiments, the monitoring systems layer 3306 facilitates alignment, such as time-synchronization, normalization, or the like of data that is collected with respect to one or more entities 3330. For example, one or more video streams or other sensor data collected of or with respect to a worker 3344 or other entity in a transactional or financial environment, such as from a set of camera-enabled IoT devices, may be aligned with a common clock, so that the relative timing of a set of videos or other data can be understood by systems that may process the videos, such as machine learning systems that operate on images in the videos, on changes between images in different frames of the video, or the like. In such an example, the financial and transactional monitoring systems layer 3306 may further align a set of videos, camera images, sensor data, or the like, with other data, such as a stream of data from wearable devices, a stream of data produced by financial or transactional systems (such as point-of-sale systems, ATMs, kiosks, handheld transaction systems, card readers, and the like), a stream of data collected by mobile data collectors, and the like. Configuration of the financial and transactional monitoring systems layer 3306 as a common platform, or set of microservices, that are accessed across many applications, may dramatically reduce the number of interconnections required by an enterprise in order to have a growing set of applications monitoring a growing set of IoT devices and other systems and devices that are under its control.

In embodiments, the data handling layers 3308 are configured in a topology that facilitates shared or common data storage across multiple applications and uses of the transactional, financial and marketplace enablement system 3300 by the financial and transactional entity and transaction-oriented data storage systems layer 3310, referred to herein for convenience in some cases simply as the data storage layer 3310 or storage layer 3310. For example, various data collected about the financial entities 3330, as well as data produced by the other data handling layers 3308, may be stored in the data storage layer 3310, such that any of the services, applications, programs, or the like of the various data handling layers 3308 can access a common data source (which may comprise a single logical data source that is distributed across disparate physical and/or virtual storage locations). This may facilitate a dramatic reduction in the amount of data storage required to handle the enormous amount of data produced by or about entities 3330 as applications of the financial and transactional IoT proliferate. For example, a supply chain or inventory management application in the financial and transactional management application platform layer 3302, such as one for ordering replacement parts for a financial or transactional machine or item of equipment, or for reordering currency or other inventory, may access the same data set about what parts have been replaced for a set of machines as a predictive maintenance application that is used to predict whether a machine is likely to require replacement parts. Similarly, prediction may be used with respect to resupply of currency or other items. In embodiments, the data storage systems layer 3310 may provide an extremely rich environment for collection of data that can be used for extraction of features or inputs for intelligence systems, such as expert systems, artificial intelligence systems, robotic process automation systems, machine learning systems, deep learning systems, supervised learning systems, or other intelligent systems as disclosed throughout this disclosure and the documents incorporated herein by reference. As a result, each application in the financial and transactional management application platform layer 3302 and each adaptive intelligent system in the adaptive intelligent systems layer 3304 can benefit from the data collected or produced by or for each of the others. A wide range of data types may be stored in the storage layer 3310 using various storage media and data storage types and formats, including, without limitation: asset and facility data 3320 (such as asset identity data, operational data, transactional data, event data, state data, workflow data, maintenance data, pricing data, ownership data, transferability data, and many other types of data relating to an asset (which may be a physical asset, digital asset, virtual asset, financial asset, securities asset, or other asset); worker data 3322 (including identity data, role data, task data, workflow data, health data, attention data, mood data, stress data, physiological data, performance data, quality data and many other types); event data 3324 (including process events, transaction events, exchange events, pricing events, promotion events, discount events, rebate events, reward events, point utilization events, financial events, output events, input events, state-change events, operating events, repair events, maintenance events, service events, damage events, injury events, replacement events, refueling events, recharging events, supply events, and many others); claims data 3354 (such as relating to insurance claims, such as for business interruption insurance, product liability insurance, insurance on goods, facilities, or equipment, flood insurance, insurance for contract-related risks, and many others, as well as claims data relating to product liability, general liability, workers compensation, injury and other liability claims and claims data relating to contracts, such as supply contract performance claims, product delivery requirements, contract claims, claims for damages, claims to redeem points or rewards, claims of access rights, warranty claims, indemnification claims, energy production requirements, delivery requirements, timing requirements, milestones, key performance indicators and others); accounting data 3358 (such as data relating to debits, credits, costs, prices, profits, margins, rates of return, valuation, write-offs, and many others); underwriting data 3360 (such as data relating to identities of prospective and actual parties involved insurance and other transactions, actuarial data, data relating to probability of occurrence and/or extent of risk associated with activities, data relating to observed activities and other data used to underwrite or estimate risk); access data 3362 (such as data relating to rights of access, tickets, tokens, licenses and other access rights described throughout this disclosure, including data structures representing access rights; pricing data 3364 (including spot market pricing, forward market pricing, pricing discount information, promotional pricing, and other information relating to the cost or price of items in any of the platform-operated marketplaces 3327 and/or external marketplaces 3390); as well as other types of data not shown, such as production data (such as data relating to production of physical or digital goods, services, events, content, and the like, as well as data relating to energy production found in databases of public utilities or independent services organizations that maintain energy infrastructure, data relating to outputs of banking, data related to outputs of mining and energy extraction facilities, outputs of drilling and pipeline facilities and many others); and supply chain data (such as relating to items supplied, amounts, pricing, delivery, sources, routes, customs information and many others).

In embodiments, the data handling layers 3308 are configured in a topology that facilitates shared adaptation capabilities, which may be provided, managed, mediated and the like by one or more of a set of services, components, programs, systems, or capabilities of the adaptive intelligent systems layer 3304, referred to in some cases herein for convenience as the adaptive intelligent systems layer 3304. The adaptive intelligent systems layer 3304 may include a set of data processing, artificial intelligence, and computational systems 3314 that are described in more detail elsewhere throughout this disclosure. Thus, use of various resources, such as computing resources (such as available processing cores, available servers, available edge computing resources, available on-device resources (for single devices or peered networks), and available cloud infrastructure, among others), data storage resources (including local storage on devices, storage resources in or on financial entities or environments (including on-device storage, storage on asset tags, local area network storage and the like), network storage resources, cloud-based storage resources, database resources and others), networking resources (including cellular network spectrum, wireless network resources, fixed network resources and others), energy resources (such as available battery power, available renewable energy, fuel, grid-based power, and many others) and others may be optimized in a coordinated or shared way on behalf of an operator, enterprise, or the like, such as for the benefit of multiple applications, programs, workflows, or the like. For example, the adaptive intelligent system layer 3304 may manage and provision available network resources for both a financial analytics application and for a financial remote control application (among many other possibilities), such that low latency resources are used for remote control and longer latency resources are used for the analytics application. As described in more detail throughout this disclosure and the documents incorporated herein by reference, a wide variety of adaptations may be provided on behalf of the various services and capabilities across the various layers 3308, including ones based on application requirements, quality of service, budgets, costs, pricing, risk factors, operational objectives, efficiency objectives, optimization parameters, returns on investment, profitability, uptime/downtime, worker utilization, and many others.

The financial and transactional management application platform layer 3302, referred to in some cases herein for convenience as the financial and transactional management application platform layer 3302, may include a set of financial and transactional processes, workflows, activities, events and applications 3312 (referred to collectively, except where context indicates otherwise, as applications 3312) that enable an operator to manage more than one aspect of an financial or transactional environment or entity 3330 in a common application environment, such as one that takes advantage of common data storage in the data storage layer 3310, common data collection or monitoring in the financial and transactional monitoring systems layer 3306 and/or common adaptive intelligence of the adaptive intelligent system layer 3304. Outputs from the applications 3312 in the financial and transactional management application platform layer 3302 may be provided to the other data handing layers 3308. These may include, without limitation, state and status information for various objects, entities, processes, flows and the like; object information, such as identity, attribute and parameter information for various classes of objects of various data types; event and change information, such as for workflows, dynamic systems, processes, procedures, protocols, algorithms, and other flows, including timing information; outcome information, such as indications of success and failure, indications of process or milestone completion, indications of correct or incorrect predictions, indications of correct or incorrect labeling or classification, and success metrics (including relating to yield, engagement, return on investment, profitability, efficiency, timeliness, quality of service, quality of product, customer satisfaction, and others) among others. Outputs from each application 3312 can be stored in the data storage layer 3310, distributed for processing by the data collection layer 3318, and used by the adaptive intelligent system layer 3304. The cross-application nature of the financial and transactional management application platform layer 3302 thus facilitates convenient organization of all of the necessary infrastructure elements for adding intelligence to any given application, such as by supplying machine learning on outcomes across applications, providing enrichment of automation of a given application via machine learning based on outcomes from other applications (or other elements of the platform 3300, and allowing application developers to focus on application-native processes while benefiting from other capabilities of the platform 3300.

Figure 34:
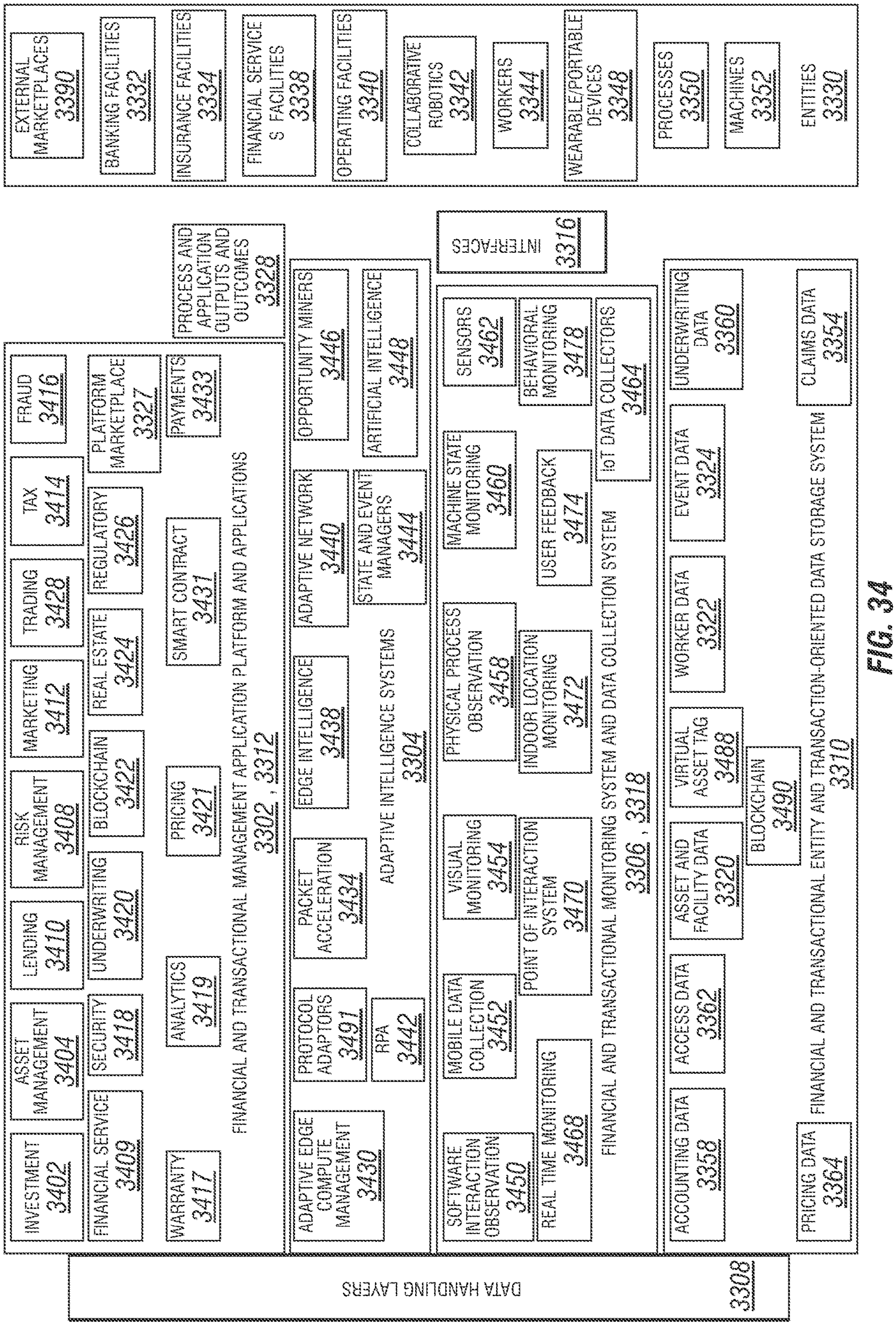
FIG. 34 depicts components and interactions of a set of data handling layers of a transactional, financial and marketplace enablement system.

Referring to FIG. 34, additional details, components, sub-systems, and other elements of an optional embodiment of the transactional, financial and marketplace enablement system 3300 of FIG. 33 are illustrated. The financial and transactional management application platform layer 3302 may, in various optional embodiments, include a set of applications, systems, solutions, interfaces, or the like, collectively referred to for convenience as applications 3312, by which an operator or owner of a transactional or financial entity, or other users, may manage, monitor, control, analyze, or otherwise interact with one or more elements of the entity 3330, such as any of the elements noted in connection above in connection FIG. 33. The set of applications 3312 may include, without limitation, one or more of any of a wide range of types of applications, such as an investment application 3402 (such as, without limitation, for investment in shares, interests, currencies, commodities, options, futures, derivatives, real property, trusts, cryptocurrencies, tokens, and other asset classes); an asset management application 3404 (such as, without limitation, for managing investment assets, real property, fixtures, personal property, real estate, equipment, intellectual property, vehicles, human resources, software, information technology resources, data processing resources, data storage resources, power generation and/or storage resources, computational resources and other assets); a lending application 3410 (such as, without limitation, for personal lending, commercial lending, collateralized lending, microlending, peer-to-peer lending, insurance-related lending, asset-backed lending, secured debt lending, corporate debt lending, student loans, mortgage lending, automotive lending, and others); a risk management application 3408 (such as, without limitation, for managing risk or liability with respect to a product, an asset, a person, a home, a vehicle, an item of equipment, a component, an information technology system, a security system, a security event, a cybersecurity system, an item of property, a health condition, mortality, fire, flood, weather, disability, malpractice, business interruption, infringement, advertising injury, slander, libel, violation of privacy or publicity rights, injury, damage to property, damage to a business, breach of a contract, and others); a payments application 3433 (such as for enabling various payments within and across marketplaces, including credit card, debit card, wire transfer, ACH, checking, currency and other payments); a marketing application 3412 (such as, without limitation, an application for marketing a financial or transactional product or service, an advertising application, a marketplace platform or system for goods, services or other items, a marketing analytics application, a customer relationship management application, a search engine optimization application, a sales management application, an advertising network application, a behavioral tracking application, a marketing analytics application, a location-based product or service targeting application, a collaborative filtering application, a recommendation engine for a product or service, and others); a trading application 3428 (such as, without limitation, a buying application, a selling application, a bidding application, an auction application, a reverse auction application, a bid/ask matching application, a securities trading application, a commodities trading application, an option trading application, a futures trading application, a derivatives trading application, a cryptocurrency trading application, a token-trading application, an analytic application for analyzing financial or transactional performance, yield, return on investment, or other metrics, a book-building application, or others); a tax application 3414 (such as, without limitation, for managing, calculating, reporting, optimizing, or otherwise handling data, events, workflows, or other factors relating to a tax, a levy, a tariff, a duty, a credit, a fee or other government-imposed charge, such as, without limitation, sales tax, income tax, property tax, municipal fees, pollution tax, renewal energy credit, pollution abatement credit, value added tax, import duties, export duties, and others); a fraud prevention application 3416 (such as, without limitation, one or more of an identity verification application, a biometric identify validation application, a transactional pattern-based fraud detection application, a location-based fraud detection application, a user behavior-based fraud detection application, a network address-based fraud detection application, a black list application, a white list application, a content inspection-based fraud detection application, or other fraud detection application, a financial service, application or solution 3409 (referred to collectively as a "financial service", such as, without limitation, a financial planning service, a tax planning service, a portfolio management service, a transaction service, a lending service, a banking service, a currency conversion service, a currency exchange service, a remittance service, a money transfer service, a wealth management service, an estate planning service, an investment banking service, a commercial banking service, a foreign exchange service, an insurance service, an investment service, an investment management service, a hedge fund service, a mutual fund service, a custody service, a credit card service, a safekeeping service, a checking service, a debit card service, a lending service, an ATM service, an ETF service, a wire transfer service, an overdraft service, a reporting service, a certified checking service, a notary service, a capital markets service, a brokerage service, a broker-dealer service, a private banking service, an insurance service, an insurance brokerage service, an underwriting service, an annuity service, a life insurance service, a health insurance service, a retirement insurance service, a property insurance service, a casualty insurance service, a finance and insurance service, a reinsurance service, an intermediation service, a trade clearinghouse service, a private equity service, a venture capital service, an angel investment service, a family office investment service, an exchange service, a payments service, a settlement service, an interbank networking service, a debt resolution service, or other financial service); a security application, solution or service 3418 (referred to herein as a security application, such as, without limitation, any of the fraud prevention applications 3416 noted above, as well as a physical security system (such as for an access control system (such as using biometric access controls, fingerprinting, retinal scanning, passwords, and other access controls), a safe, a vault, a cage, a safe room, or the like), a monitoring system (such as using cameras, motion sensors, infrared sensors and other sensors), a cyber security system (such as for virus detection and remediation, intrusion detection and remediation, spam detection and remediation, phishing detection and remediation, social engineering detection and remediation, cyberattack detection and remediation, packet inspection, traffic inspection, DNS attack remediation and detection, and others) or other security application); an underwriting application 3420 (such as, without limitation, for underwriting any insurance offering, any loan, or any other transaction, including any application for detecting, characterizing or predicting the likelihood and/or scope of a risk, including underwriting based on any of the data sources, events or entities noted throughout this disclosure or the documents incorporated herein by reference); a blockchain application 3422 (such as, without limitation, a distributed ledger capturing a series of transactions, such as debits or credits, purchases or sales, exchanges of in kind consideration, smart contract events, or the like, a cryptocurrency application, or other blockchain-based application); a real estate application 3424 (such as, without limitation, a real estate brokerage application, a real estate valuation application, a real estate investment trust application, a real estate mortgage or lending application, a real estate assessment application, a real estate marketing application, or other); a regulatory application 3426 (such as, without limitation, an application for regulating any of the applications, services, transactions, activities, workflows, events, entities, or other items noted herein and in the documents incorporated by reference herein, such as regulation of pricing, marketing, offering of securities, offering of insurance, undertaking of broker or dealer activities, use of data (including data privacy regulations, regulations relating to storage of data and others), banking, marketing, sales, financial planning, and many others); a platform-operated marketplace 3327 application, solution or service (referred to in some cases simply as a marketplace application (which term may also, as context permits include various types of external marketplaces 3390), such as, without limitation an e-commerce marketplace, an auction marketplace, a physical goods marketplace, a virtual goods marketplace, an advertising marketplace, a reverse-auction marketplace, an advertising network, a marketplace for attention resources, an energy trading marketplace, a marketplace for computing resources, a marketplace for networking resources, a spectrum allocation marketplace, an Internet advertising marketplace, a television advertising marketplace, a print advertising marketplace, a radio advertising marketplace, an in-game advertising marketplace, an in-virtual reality advertising marketplace, an in-augmented reality marketplace, a real estate marketplace, a hospitality marketplace, a travel services marketplace, a financial services marketplace, a blockchain-based marketplace, a cryptocurrency marketplace, a token-based marketplace, a loyalty program marketplace, a time share marketplace, a rideshare marketplace, a mobility marketplace, a transportation marketplace, a space-sharing marketplace, or other marketplace); a warranty application 3417 (such as, without limitation, an application for a warranty or guarantee with respect to a product, a service, an offering, a solution, a physical product, software, a level of service, quality of service, a financial instrument, a debt, an item of collateral, performance of a service, or other item); an analytics solution 3419 (such as, without limitation, an analytic application with respect to any of the data types, applications, events, workflows, or entities mentioned throughout this disclosure or the documents incorporated by reference herein, such as a big data application, a user behavior application, a prediction application, a classification application, a dashboard, a pattern recognition application, an econometric application, a financial yield application, a return on investment application, a scenario planning application, a decision support application, and many others); a pricing application 3421 (such as, without limitation, for pricing of goods, services (including any mentioned throughout this disclosure and the documents incorporated by reference herein), applications (including any mentioned throughout this disclosure and the documents incorporated by reference herein), software, data services, insurance, virtual goods, advertising placements, search engine and keyword placements, and many others; and a smart contract application, solution, or service (referred to collectively herein as a smart contract application, such as, without limitation, any of the smart contract types referred to in this disclosure or in the documents incorporated herein by reference, such as a smart contract using a token or cryptocurrency for consideration, a smart contract that vests a right, an option, a future, or an interest based on a future condition, a smart contract for a security, commodity, future, option, derivative, or the like, a smart contract for current or future resources, a smart contract that is configured to account for or accommodate a tax, regulatory or compliance parameter, a smart contract that is configured to execute an arbitrage transaction, or many others). Thus, the financial and transactional management application platform layer 3302 may host an enable interaction among a wide range of disparate applications 3312 (such term including the above-referenced and other financial or transactional applications, services, solutions, and the like), such that by virtue of shared microservices, shared data infrastructure, and shared intelligence, any pair or larger combination or permutation of such services may be improved relative to an isolated application of the same type.

In embodiments, the adaptive intelligent systems layer 3304 may include a set of systems, components, services, and other capabilities that collectively facilitate the coordinated development and deployment of intelligent systems, such as ones that can enhance one or more of the applications 3312 at the financial and transactional management application platform layer 3302. These adaptive intelligence systems layer 3304 may include an adaptive edge compute management solution 3430, a robotic process automation system 3442, a set of protocol adaptors 3491, a packet acceleration system 3434, an edge intelligence system 3438, an adaptive networking system 3440, a set of state and event managers 3444, a set of opportunity miners 3446, a set of artificial intelligence systems 3448 and other systems.

In embodiments, the financial and transactional monitoring systems layer 3306 and its data collection systems 3318 may include a wide range of systems for collection of data. This layer may include, without limitation, real time monitoring systems 3468 (such as onboard monitoring systems like event and status reporting systems on ATMs, POS systems, kiosks, vending machines and the like; OBD and telematics systems on vehicle and equipment; systems providing diagnostic codes and events via an event bus, communication port, or other communication system; monitoring infrastructure (such as cameras, motion sensors, beacons, RFID systems, smart lighting systems, asset tracking systems, person tracking systems, and ambient sensing systems located in various environments where transactions and other events take place), as well as removable and replaceable monitoring systems, such as portable and mobile data collectors, RFID and other tag readers, smart phones, tablets and other mobile device that are capable of data collection and the like); software interaction observation systems 3450 (such as for logging and tracking events involved in interactions of users with software user interfaces, such as mouse movements, touchpad interactions, mouse clicks, cursor movements, keyboard interactions, navigation actions, eye movements, finger movements, gestures, menu selections, and many others, as well as software interactions that occur as a result of other programs, such as over APIs, among many others); mobile data collectors 3452 (such as described extensively herein and in documents incorporated by reference), visual monitoring systems 3454 (such as using video and still imaging systems, LIDAR, IR and other systems that allow visualization of items, people, materials, components, machines, equipment, personnel, gestures, expressions, positions, locations, configurations, and other factors or parameters of entities 3330, as well as inspection systems that monitor processes, activities of workers and the like); point of interaction systems 3470 (such as point of sale systems, kiosks, ATMs, vending machines, touch pads, camera-based interaction tracking systems, smart shopping carts, user interfaces of online and in-store vending and commerce systems, tablets, and other systems at the point of sale or other interaction by a customer or worker involved in shopping and/or a transaction); physical process interaction observation systems 3458 (such as for tracking physical activities of customers, physical activities of transaction parties (such as traders, vendors, merchants, customers, negotiators, brokers, and the like), physical interactions of workers with other workers, interactions of workers with physical entities like machines and equipment, and interactions of physical entities with other physical entities, including, without limitation, by use of video and still image cameras, motion sensing systems (such as including optical sensors, LIDAR, IR and other sensor sets), robotic motion tracking systems (such as tracking movements of systems attached to a human or a physical entity) and many others; machine state monitoring systems 3460 (including onboard monitors and external monitors of conditions, states, operating parameters, or other measures of the condition of a machine, such as a client, a server, a cloud resource, an ATM, a kiosk, a vending machine, a POS system, a sensor, a camera, a smart shopping cart, a smart shelf, a vehicle, a robot, or other machine); sensors and cameras 3462 and other IoT data collection systems 3464 (including onboard sensors, sensors or other data collectors (including click tracking sensors) in or about a financial or transactional environment (such as, without limitation, an office, a back office, a store, a mall, a virtual store, an online environment, a website, a bank, or many others), cameras for monitoring an entire environment, dedicated cameras for a particular machine, process, worker, or the like, wearable cameras, portable cameras, cameras disposed on mobile robots, cameras of portable devices like smart phones and tablets, and many others, including any of the many sensor types disclosed throughout this disclosure or in the documents incorporated herein by reference); indoor location monitoring systems 3472 (including cameras, IR systems, motion-detection systems, beacons, RFID readers, smart lighting systems, triangulation systems, RF and other spectrum detection systems, time-of-flight systems, chemical noses and other chemical sensor sets, as well as other sensors); user feedback systems 3474 (including survey systems, touch pads, voice-based feedback systems, rating system, expression monitoring systems, affect monitoring systems, gesture monitoring systems, and others); behavioral monitoring systems 3478 (such as for monitoring movements, shopping behavior, buying behavior, clicking behavior, behavior indicating fraud or deception, user interface interactions, product return behavior, behavior indicative of interest, attention, boredom or the like, mood-indicating behavior (such as fidgeting, staying still, moving closer, or changing posture) and many others); and any of a wide variety of Internet of Things (IoT) data collectors 3464, such as those described throughout this disclosure and in the documents incorporated by reference herein.

In embodiments, the financial entity-oriented data storage systems layer 3310 may include a range of systems for storage of data, such as the accounting data 3358, access data 3362, pricing data 3364, asset and facility data 3320, worker data 3322, event data 3324, underwriting data 3360 and claims data 3354. These may include, without limitation, physical storage systems, virtual storage systems, local storage systems, distributed storage systems, databases, memory, network-based storage, network-attached storage systems (such as using NVME, storage attached networks, and other network storage systems), and many others. In embodiments, the storage layer 3310 may store data in one or more knowledge graphs (such as a directed acyclic graph, a data map, a data hierarchy, a data cluster including links and nodes, a self-organizing map, or the like). In embodiments, the data storage layer 3310 may store data in a digital thread, ledger, or the like, such as for maintaining a longitudinal record of an entity 3330 over time, including any of the entities described herein. In embodiments, the data storage layer 3310 may use and enable a virtual asset tag 3488, which may include a data structure that is associated with an asset and accessible and managed as if the tag were physically located on the asset, such as by use of access controls, so that storage and retrieval of data is optionally linked to local processes, but also optionally open to remote retrieval and storage options. In embodiments, the storage layer 3310 may include one or more blockchains 3490, such as ones that store identity data, transaction data, entity data for the entities 3330, pricing data, ownership transfer data, data for operation by smart contracts 3431, historical interaction data, and the like, such as with access control that may be role-based or may be based on credentials associated with an entity 3330, a service, or one or more applications 3312.

Figure 35:
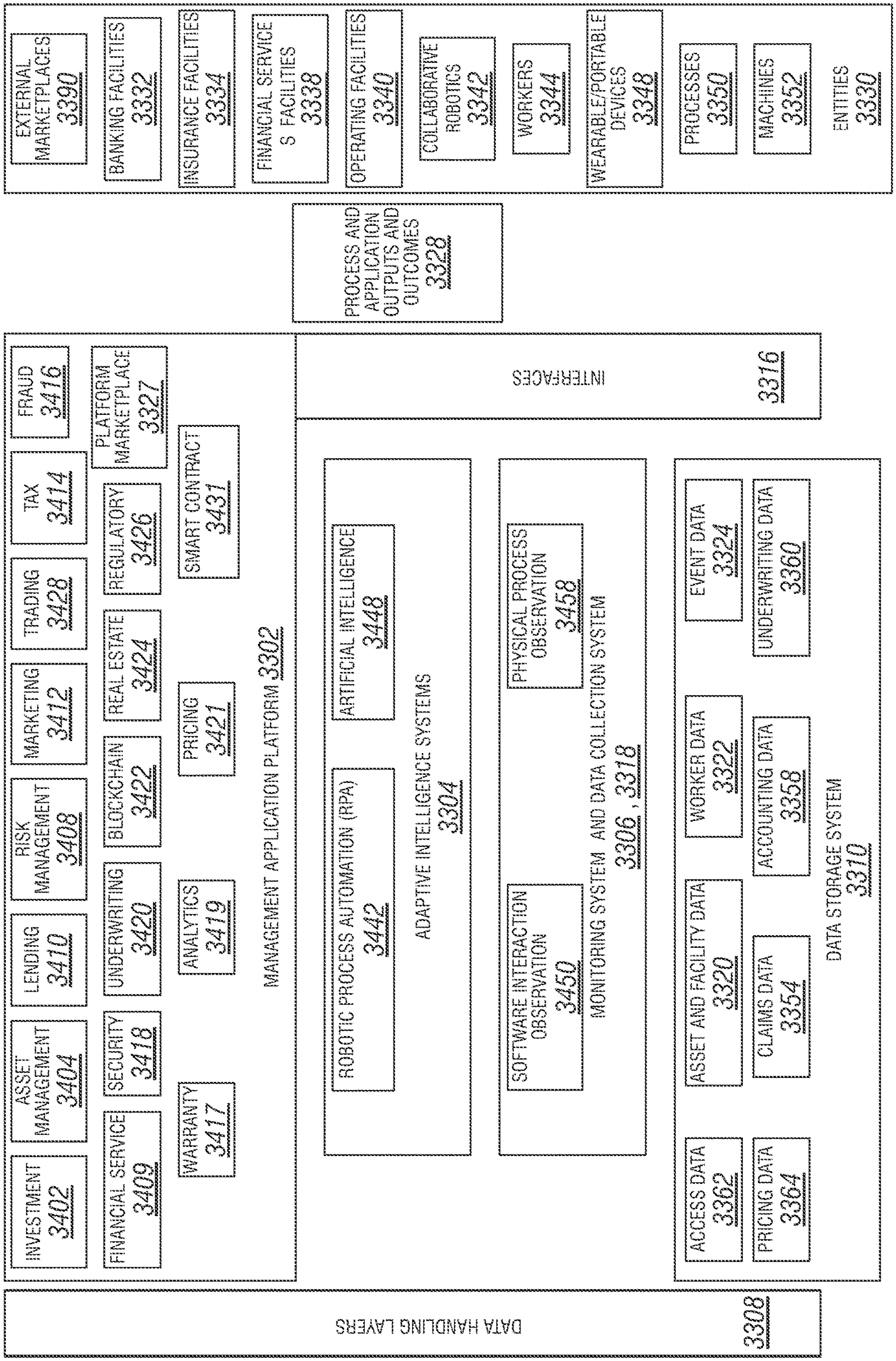
FIG. 35 depicts adaptive intelligence and robotic process automation capabilities of a transactional, financial and marketplace enablement system.

Referring to FIG. 35, the adaptive intelligent systems layer 3304 may include a robotic process automation (RPA) system 3442, which may include a set of components, processes, services, interfaces and other elements for development and deployment of automation capabilities for various financial entities 3330, environments, and applications 3312. Without limitation, robotic process automation 3442 may be applied to each of the processes that is managed, controlled, or mediated by each of the set of applications 3312 of the platform application layer.

In embodiments, robotic process automation 3442 may take advantage of the presence of multiple applications 3312 within the financial and transactional management application platform layer 3302, such that a pair of applications may share data sources (such as in the data storage layer 3310) and other inputs (such as from the monitoring layer 3306) that are collected with respect to financial entities 3330, as well sharing outputs, events, state information and outputs, which collectively may provide a much richer environment for process automation, including through use of artificial intelligence 3448 (including any of the various expert systems, artificial intelligence systems, neural networks, supervised learning systems, machine learning systems, deep learning systems, and other systems described throughout this disclosure and in the documents incorporated by reference). For example, a real estate application 3424 may use robotic process automation 3442 for automation of a real estate inspection process that is normally performed or supervised by a human (such as by automating a process involving visual inspection using video or still images from a camera or other that displays images of an entity 3330, such as where the robotic process automation 3442 system is trained to automate the inspection by observing interactions of a set of human inspectors or supervisors with an interface that is used to identify, diagnose, measure, parameterize, or otherwise characterize possible defects or favorable characteristics of a house, a building, or other real estate property or item. In embodiments, interactions of the human inspectors or supervisors may include a labeled data set where labels or tags indicate types of defects, favorable properties, or other characteristics, such that a machine learning system can learn, using the training data set, to identify the same characteristics, which in turn can be used to automate the inspection process such that defects or favorable properties are automatically classified and detected in a set of video or still images, which in turn can be used within the real estate solution 3424 to flag items that require further inspection, that should be rejected, that should be disclosed to a prospective buyer, that should be remediated, or the like. In embodiments, robotic process automation 3442 may involve multi-application or cross-application sharing of inputs, data structures, data sources, events, states, outputs, or outcomes. For example, the real estate application 3424 may receive information from a platform-operated marketplace application 3327 that may enrich the robotic process automation 3442 of the real estate application 3424, such as information about the current pricing of an item from a particular vendor that is located at a real estate property (such as a pool, spa, kitchen appliance, TV or other items), which may assist in populating the characteristics about the real estate for purpose of facilitating an inspection process, a valuation process, a disclosure process, or the like. These and many other examples of multi-application or cross-application sharing for robotic process automation 3442 across the applications 3312 are encompassed by the present disclosure.

In embodiments, robotic process automation may be applied to shared or converged processes among the various pairs of the applications 3312 of the financial and transactional management application platform layer 3302, such as, without limitation, of a converged process involving a security application 3418 and a lending application 3410, integrated automation of blockchain-based applications 3422 with platform-operated marketplace applications 3327, and many others. In embodiments, converged processes may include shared data structures for multiple applications 3312 (including ones that track the same transactions on a blockchain but may consume different subsets of available attributes of the data objects maintained in the blockchain or ones that use a set of nodes and links in a common knowledge graph). For example, a transaction indicating a change of ownership of an entity 3330 may be stored in a blockchain and used by multiple applications 3312, such as to enable role-based access control, role-based permissions for remote control, identity-based event reporting, and the like. In embodiments, converged processes may include shared process flows across applications 3312, including subsets of larger flows that are involved in one or more of a set of applications 3312. For example, an underwriting or inspection flow about an entity 3330 may serve a lending solution 3410, an analytics solution 3419, an asset management solution 3404, and others.

In embodiments, robotic process automation 3442 may be provided for the wide range of financial and transactional processes mentioned throughout this disclosure and the documents incorporated herein by reference, including without limitation energy trading, banking, transportation, storage, energy storage, maintenance processes, service processes, repair processes, supply chain processes, inspection processes, purchase and sale processes, underwriting processes, compliance processes, regulatory processes, fraud detection processes, fault detection processes, power utilization optimization processes, and many others. An environment for development of robotic process automation may include a set of interfaces for developers in which a developer may configure an artificial intelligence system 3448 to take inputs from selected data sources of the data storage layer 3310 and events or other data from the monitoring systems layer 3306 and supply them, such as to a neural network, either as inputs for classification or prediction, or as outcomes. The RPA development environment 3442 may be configured to take outputs and outcomes 3328 from various applications 3312, again to facilitate automated learning and improvement of classification, prediction, or the like that is involved in a step of a process that is intended to be automated. In embodiments, the development environment, and the resulting robotic process automation 3442 may involve monitoring a combination of both software interaction observation 3450 (e.g., by workers interacting with various software interfaces of applications 3312 involving entities 3330) and physical process interaction observations 3458 (e.g., by watching workers interacting with or using machines, equipment, tools, or the like). In embodiments, software interaction observation 3450 may include interactions among software components with other software components, such as how one application 3312 interacts via APIs with another application 3312. In embodiments, observation of physical process interaction observations 3458 may include observation (such as by video cameras, motion detectors, or other sensors, as well as detection of positions, movements, or the like of hardware, such as robotic hardware) of how human workers interact with financial entities 3330 (such as locations of workers (including routes taken through a location, where workers of a given type are located during a given set of events, processes or the like, how workers manipulate pieces of equipment or other items using various tools and physical interfaces, the timing of worker responses with respect to various events (such as responses to alerts and warnings), procedures by which workers undertake scheduled maintenance, updates, repairs and service processes, procedures by which workers tune or adjust items involved in workflows, and many others). Physical process interaction observations 3458 may include tracking positions, angles, forces, velocities, acceleration, pressures, torque, and the like of a worker as the worker operates on hardware, such as with a tool. Such observations may be obtained by any combination of video data, data detected within a machine (such as of positions of elements of the machine detected and reported by position detectors), data collected by a wearable device (such as an exoskeleton that contains position detectors, force detectors, torque detectors and the like that is configured to detect the physical characteristics of interactions of a human worker with a hardware item for purposes of developing a training data set). By collecting both software interaction observations 3450 and physical process interaction observations 3458 the RPA system 3442 can more comprehensively automate processes involving financial entities 3330, such as by using software automation in combination with physical robots.

In embodiments, robotic process automation 3442 is configured to train a set of physical robots that have hardware elements that facilitate undertaking tasks that are conventionally performed by humans. These may include robots that walk (including walking up and down stairs), climb (such as climbing ladders), move about a facility, attach to items, grip items (such as using robotic arms, hands, pincers, or the like), lift items, carry items, remove, and replace items, use tools and many others.

With reference to FIG. 35, in embodiments provided herein is a transactional, financial and marketplace enablement system. An example system may include a robotic process automation circuit structured to interpret information from a plurality of data sources, and to interface with a plurality of management applications; wherein the plurality of management applications are each associated with a separate one of a plurality of financial entities; and wherein the robotic process automation circuit further comprises an artificial intelligence circuit structured to improve a process of at least one of the plurality of management applications in response to the information from the plurality of data sources.

Certain further aspects of an example system are described following, any one or more of which may be present in certain embodiments. An example system may include wherein the artificial intelligence circuit further comprises at least one circuit selected from the circuits consisting of: a smart contract services circuit, a valuation circuit, and an automated agent circuit.

An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the plurality of management applications includes a real estate application, and wherein the robotic process automation circuit is further structured to automate a real estate inspection process.

An example system may include wherein the robotic process automation circuit is further structured to automate the real estate inspection process by performing at least one operation selected from the operations consisting of: providing one of a video inspection command or a camera inspection command; utilizing data from the plurality of data sources to schedule an inspection event; and determining inspection criteria in response to a plurality of inspection data and inspection outcomes, and providing an inspection command in response to the plurality of inspection data and inspection outcomes.

An example system may include wherein the robotic process automation circuit is further structured to automate the real estate inspection process in response to at least one of the plurality of data sources that is not accessible to the real estate application.

An example system may include wherein at least one of the plurality of data sources is not accessible to each of the at least one of the plurality of management applications having an improved process by the robotic automation circuit.

An example system may include wherein the at least one of the plurality of management applications having an improved process by the robotic automation circuit comprises a real estate application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic automation circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic automation circuit comprises a lending management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic automation circuit comprises a trading management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises an analytics management application, and wherein the at least one of the plurality of data sources comprises at least one data source selected from the data sources consisting of: an access data source, a claims data source, a worker data source, and an event data source.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the artificial intelligence circuit is further structured to iteratively improve the process in response to the outcome from the at least one entity.

Figure 36:
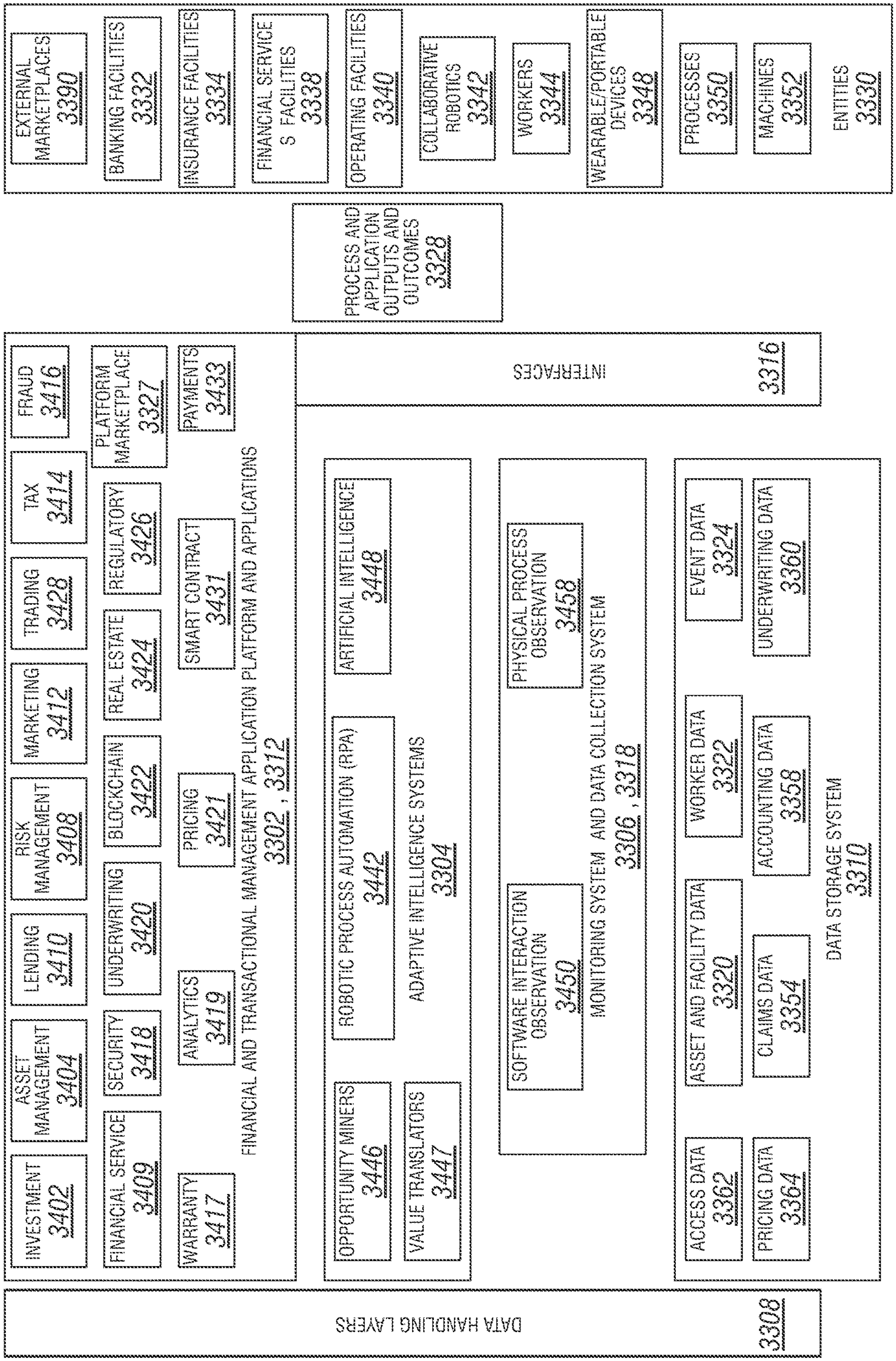
FIG. 36 depicts opportunity mining capabilities of a transactional, financial and marketplace enablement system.

Referring to FIG. 36, a set of opportunity miners 3446 may be provided as part of the adaptive intelligent systems layer 3304, which may be configured to seek and recommend opportunities to improve one or more of the elements of the platform 3300, such as via addition of artificial intelligence 3448, automation (including robotic process automation 3442), or the like to one or more of the systems, sub-systems, components, applications or the like of the platform 100 or with which the platform 100 interacts. In embodiments, the opportunity miners 3446 may be configured or used by developers of AI or RPA solutions to find opportunities for better solutions and to optimize existing solutions. In embodiments, the opportunity miners 3446 may include a set of systems that collect information within the platform 100 and collect information within, about and for a set of environments and entities 3330, where the collected information has the potential to help identify and prioritize opportunities for increased automation and/or intelligence. For example, the opportunity miners 3446 may include systems that observe clusters of workers by time, by type, and by location, such as using cameras, wearables, or other sensors, such as to identify labor-intensive areas and processes in set of financial environments. These may be presented, such as in a ranked or prioritized list, or in a visualization (such as a heat map showing dwell times of customers, workers, or other individuals on a map of an environment or a heat map showing routes traveled by customers or workers within an environment) to show places with high labor activity. In embodiments, analytics solutions 3419 may be used to identify which environments or activities would most benefit from automation for purposes of labor saving, profit optimization, yield optimization, increased up time, increased throughput, increased transaction flow, improved security, improved reliability, or other factors.

In embodiments, opportunity miners 3446 may include systems to characterize the extent of domain-specific or entity-specific knowledge or expertise required to undertake an action, use a program, use a machine, or the like, such as observing the identity, credentials and experience of workers involved in given processes. This may be of particular benefit in situations where very experienced workers are involved (such as in complex transactions that require significant experience (such as multi-party transactions); in complex back-office processes involving significant expertise or training (such as risk management, actuarial and underwriting processes, asset allocation processes, investment decision processes, or the like); in update, maintenance, porting, backup, or re-build processes on large or complex machines; or in fine-tuning of complex processes where accumulated experience is required for effective work), especially where the population of those workers may be scarce (such as due to retirement or a dwindling supply of new workers having the same credentials). Thus, a set of opportunity miners 3446 may collect and supply to an analytics solution 3419, such as for prioritizing the development of automation 3442, data indicating what processes of or about an entity 3330 are most intensively dependent on workers that have particular sets of experience or credentials, such as ones that have experience or credentials that are scarce or diminishing. The opportunity miners 3446 may, for example, correlate aggregated data (including trend information) on worker ages, credentials, experience (including by process type) with data on the processes in which those workers are involved (such as by tracking locations of workers by type, by tracking time spent on processes by worker type, and the like). A set of high value automation opportunities may be automatically recommended based on a ranking set, such as one that weights opportunities at least in part based on the relative dependence of a set of processes on workers who are scarce or are expected to become scarcer.

In embodiments, the set of opportunity miners 3446 may use information relating to the cost of the workers involved in a set of processes, such as by accessing worker data 3322, including human resource database information indicating the salaries of various workers (either as individuals or by type), information about the rates charged by service workers or other contractors, or the like. An opportunity miner 3446 may provide such cost information for correlation with process tracking information, such as to enable an analytics solution 3419 to identify what processes are occupying the most time of the most expensive workers. This may include visualization of such processes, such as by heat maps that show what locations, routes, or processes are involving the most expensive time of workers in financial environments or with respect to entities 3330. The opportunity miners 3446 may supply a ranked list, weighted list, or other data set indicating to developers what areas are most likely to benefit from further automation or artificial intelligence deployment.

In embodiments, mining an environment for robotic process automation opportunities may include searching an HR database and/or other labor-tracking database for areas that involve labor-intensive processes; searching a system for areas where credentials of workers indicating potential for automation; tracking clusters of workers by a wearable to find labor-intensive machines or processes; tracking clusters of workers by a wearable by type of worker to find labor-intensive processes, and the like.

In embodiments, opportunity mining may include facilities for solicitation of appropriate training data sets that may be used to facilitate process automation. For example, certain kinds of inputs, if available, would provide very high value for automation, such as video data sets that capture very experienced and/or highly expert workers performing complex tasks. Opportunity miners 3446 may search for such video data sets as described herein; however, in the absence of success (or to supplement available data), the platform may include systems by which a user, such as a developer, may specify a desired type of data, such as software interaction data (such as of an expert working with a program to perform a particular task), video data (such as video showing a set of experts performing a certain kind of repair, an expert rebuilding a machine, an expert optimizing a certain kind of complex process, or the like), physical process observation data (such as video, sensor data, or the like). The specification may be used to solicit such data, such as by offering some form of consideration (e.g., monetary reward, tokens, cryptocurrency, licenses or rights, revenue share, or other consideration) to parties that provide data of the requested type. Rewards may be provided to parties for supplying pre-existing data and/or for undertaking steps to capture expert interactions, such as by taking video of a process. The resulting library of interactions captured in response to specification, solicitation and rewards may be captured as a data set in the data storage layer 3310, such as for consumption by various applications 3312, adaptive intelligent systems layer 3304, and other processes and systems. In embodiments, the library may include videos that are specifically developed as instructional videos, such as to facilitate developing an automation map that can follow instructions in the video, such as providing a sequence of steps according to a procedure or protocol, breaking down the procedure or protocol into sub-steps that are candidates for automation, and the like. In embodiments, such videos may be processed by natural language processing, such as to automatically develop a sequence of labeled instructions that can be used by a developer to facilitate a map, a graph, or other model of a process that assists with development of automation for the process. In embodiments, a specified set of training data sets may be configured to operate as inputs to learning. In such cases the training data may be time-synchronized with other data within the platform 3300, such as outputs and outcomes from applications 3312, outputs and outcomes of financial entities 3330, or the like, so that a given video of a process can be associated with those outputs and outcomes, thereby enabling feedback on learning that is sensitive to the outcomes that occurred when a given process that was captured (such as on video, or through observation of software interactions or physical process interactions).

In embodiments, opportunity miners 3446 may include methods, systems, processes, components, services, and other elements for mining for opportunities for smart contract definition, formation, configuration, and execution. Data collected within the platform 3300, such as any data handled by the data handling layers 3308, stored by the data storage layer 3310, collected by the monitoring systems layer 3306 and data collection systems 3318, collected about or from entities 3330 or obtained from external sources may be used to recognize beneficial opportunities for application or configuration of smart contracts. For example, pricing information about an entity 3330, handled by a pricing application 3421, or otherwise collected, may be used to recognize situations in which the same item or items is disparately priced (in a spot market, futures market, or the like), and the opportunity miner 3446 may provide an alert indicating an opportunity for smart contract formation, such as a contract to buy in one environment at a price below a given threshold and sell in another environment at a price above a given threshold, or vice versa. In embodiments, robotic process automation 3442 may be used to automate smart contract creation, configuration, and/or execution, such as by training on a training set of data relating to experts who form such contract or based on feedback on outcomes from past contracts. Smart contract opportunities may also be recognized based on patterns, such as where predictions are used to indicate opportunities for options, futures, derivatives, forward market contracts, and other forward-looking contracts, such as where a smart contract is created based on a prediction that a future condition will arise that creates an opportunity for a favorable exchange, such as an arbitrage transaction, a hedging transaction, an "in-the-money" option, a tax-favored transaction, or the like. In embodiments, at a first step an opportunity miner 3446 seeks a price level for an item, service, good, or the like in a set of current or future markets. At a second step the opportunity miner 3446 determines a favorable condition for a smart contract (such as an arbitrage opportunity, tax saving opportunity, favorable option, favorable hedge, or the like). At a next step, the opportunity miner 3446 may initiate a smart contract process in which a smart contract is pre-configured with a description of an item, a description of a price or other term or condition, a domain for execution (such as a set of markets in which the contract will be formed) and a time. At a next step, an automation process may form the smart contract and execute it within the applicable domains. At a final step the platform may settle the contract, such as when conditions are met. In embodiments, the opportunity miners 3446 may be configured to maintain a set of value translators 3447 that may be developed to calculate exchange values of different items between and across disparate domains, such as by translating the value of various resources (e.g., computational, bandwidth, energy, attention, currency, tokens, credits (e.g., tax credits, renewable energy credits, pollution credits), cryptocurrency, goods, licenses (e.g., government-issued licenses, such as for spectrum, for the right to perform services or the like, as well as intellectual property licenses, software licenses and others), services and other items) with respect to other such resources, including accounting for any costs of transacting across domains to convert one resource to the other in a contract or series of contracts, such as ones executed via smart contracts. Value translators 3447 may translate between and among current (e.g., spot market) value, value in defined futures markets (such as day-ahead energy prices) and predicted future value outside defined futures markets. In embodiments, opportunity miners 3446 may operate across pairs or other combinations of value translators (such as across, two, three, four, five or more domains) to define a series of transaction amounts, configurations, domains, and timing that will result in generation of value by virtue of undertaking transactions that result in favorable translation of value. For example, a cryptocurrency token may be exchanged for a pollution credit, which may be used to permit generation of energy, which may be sold for a price that exceeds the value of the cryptocurrency token by more than the cost of creating the smart contract and undertaking the series of exchanges.

With reference to FIG. 36, in embodiments provided herein is a transactional, financial and marketplace enablement system. An example system may include a robotic process automation circuit structured in interpret information from a plurality of data sources, and to interface with a plurality of management applications; wherein the plurality of management applications are each associated with a separate one of a plurality of financial entities; and wherein the robotic process automation circuit further comprises an opportunity miner component structured to determine a process improvement opportunity for at least one of the plurality of management applications in response to the information from the plurality of data sources; and to provide an output to at least one entity associated with the process improvement opportunity in response to the determined process improvement opportunity.

Certain further aspects of an example system are described following, any one or more of which may be present in certain embodiments. An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the opportunity miner component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the opportunity miner component is further structured to determine the process improvement opportunity in response to at least one parameter selected from the parameters consisting of: a time saving value, a cost saving value, and an improved outcome value.

An example system may include wherein the opportunity miner component is further structured to determine the process improvement opportunity in response to a value translation from a value translation application.

An example system may include wherein the plurality of management applications includes a trading application, and wherein the robotic process automation circuit is further structured to automate a trading service process.

An example system may include wherein the robotic process automation circuit is further structured to automate the trading service process by performing at least one operation selected from the operations consisting of: utilizing data from the plurality of data sources to schedule a trading event; and determining trading criteria in response to a plurality of asset data and trading outcomes, and providing a trading command in response to the plurality of asset data and trading outcomes.

An example system may include wherein the robotic process automation circuit is further structured to automate the trading service process in response to at least one of the plurality of data sources that is not accessible to the trading application.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the opportunity miner component is further structured to iteratively improve the process in response to the outcome from the at least one entity.

An example system may include wherein at least one of the plurality of data sources is not accessible to each of the at least one of the plurality of management applications having an improved process by the robotic automation circuit.

An example system may include wherein the at least one of the plurality of management applications having an improved process by the robotic automation circuit comprises a tax application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic automation circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic automation circuit comprises a lending management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic automation circuit comprises an investment management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises an underwriting management application, and wherein the at least one of the plurality of data sources comprises at least one data source selected from the data sources consisting of: an access data source, a claims data source, a worker data source, and an event data source.

Figure 37:
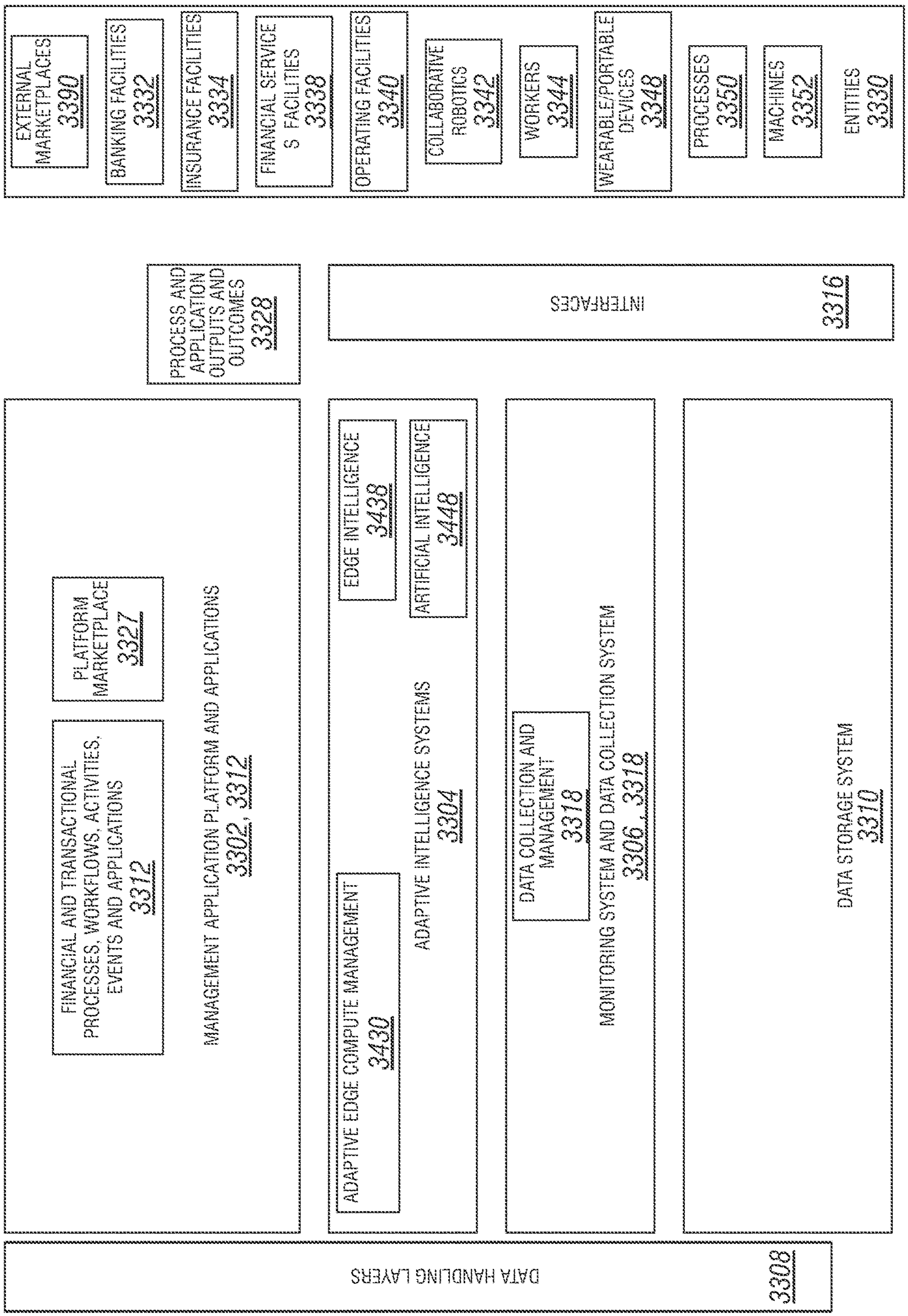
FIG. 37 depicts adaptive edge computation management and edge intelligence capabilities of a transactional, financial and marketplace enablement system.

Referring to FIG. 37, additional details of an embodiment of the platform transactional, financial and marketplace enablement system are provided, in particular relating to elements of the adaptive intelligent systems layer 3304 that facilitate improved edge intelligence, including the adaptive edge compute management system 3430 and the edge intelligence system 3438. These elements provide a set of systems that adaptively manage "edge" computation, storage, and processing, such as by varying storage locations for data and processing locations (e.g., optimized by AI) between on-device storage, local systems, in the network and in the cloud. These elements 3430, 3438 enable facilitation of a dynamic definition by a user, such as a developer, operator, or host of the platform 100, of what constitutes the "edge" for purposes of a given application. For example, for environments where data connections are slow or unreliable (such as where a facility does not have good access to cellular networks (such as due to remoteness of some environments (such as in geographies with poor cellular network infrastructure), shielding or interference (such as where density of network-using systems, thick walls, underground location, or presence of large metal objects (such as vaults) interferes with networking performance), and/or congestion (such as where there are many devices seeking access to limited networking facilities), edge computing capabilities can be defined and deployed to operate on the local area network of an environment, in peer-to-peer networks of devices, or on computing capabilities of local financial entities 3330. Where strong data connections are available (such as where good back-haul facilities exist), edge computing capabilities can be disposed in the network, such as for caching frequently used data at locations that improve input/output performance, reduce latency, or the like. Thus, adaptive definition and specification of where edge computing operations is enabled, under control of a developer or operator, or optionally determined automatically, such as by an expert system or automation system, such as based on detected network conditions for an environment, for an entity 3330, or for a network as a whole. In embodiments, an edge intelligence system 3438 enables adaptation of edge computation (including where computation occurs within various available networking resources, how networking occurs (such as by protocol selection), where data storage occurs, and the like) that is multi-application aware, such as accounting for QoS, latency requirements, congestion, and cost as understood and prioritized based on awareness of the requirements, the prioritization, and the value (including ROI, yield, and cost information, such as costs of failure) of edge computation capabilities across more than one application, including any combinations and subsets of the applications 3312 described herein or in the documents incorporated herein by reference.

With reference to FIG. 37, in embodiments provided herein is a transactional, financial and marketplace enablement system. An example system may include an adaptive edge computing circuit structured to interpret information from a plurality of data sources, and to interface with a plurality of management applications; wherein the plurality of management applications are each associated with a separate one of a plurality of financial entities; and wherein the adaptive edge computing circuit further comprises an edge intelligence component structured to determine an edge intelligence process improvement for at least one of the plurality of management applications in response to the information from the plurality of data sources.

Certain further aspects of an example system are described following, any one or more of which may be present in certain embodiments. An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the edge intelligence component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the edge intelligence component is further structured to determine a process improvement opportunity in response to at least one parameter selected from the parameters consisting of: a time saving value, a cost saving value, and an improved outcome value.

An example system may include wherein the plurality of management applications includes a security application, and wherein the adaptive edge computing circuit is further structured to automate a security service process.

An example system may include wherein the adaptive edge computing circuit is further structured to automate the security service process by performing at least one operation selected from the operations consisting of: utilizing data from the plurality of data sources to schedule a security event; and determining security criteria in response to a plurality of asset data and security outcomes, and providing a security command in response to the plurality of asset data and security outcomes.

An example system may include wherein the adaptive edge computing circuit is further structured to automate the security service process in response to at least one of the plurality of data sources that is not accessible to the security application.

An example system may include wherein the adaptive edge computing circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the adaptive edge computing circuit is further structured to interpret an outcome from the at least one entity, and wherein the edge intelligence component is further structured to iteratively improve the process in response to the outcome from the at least one entity.

An example system may include wherein at least one of the plurality of data sources is not accessible to each of the at least one of the plurality of management applications having an improved process by the adaptive edge computing circuit.

An example system may include wherein the at least one of the plurality of management applications having an improved process by the adaptive edge computing circuit comprises a risk application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the adaptive edge computing circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the adaptive edge computing circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the adaptive edge computing circuit comprises a platform marketplace application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the adaptive edge computing circuit comprises a platform marketplace application, and wherein the adaptive edge computing circuit is further structured to operate an interface to interpret an edge definition, and wherein an edge intelligence component is further structured to determine the edge intelligence process improvement in response to the edge definition.

An example system may include wherein the edge definition comprises an identification of at least one of the following parameters: a slow data connection, an unreliable data connection, a network interference description, a network caching description, a quality of service requirement, or a latency requirement.

Figure 38:
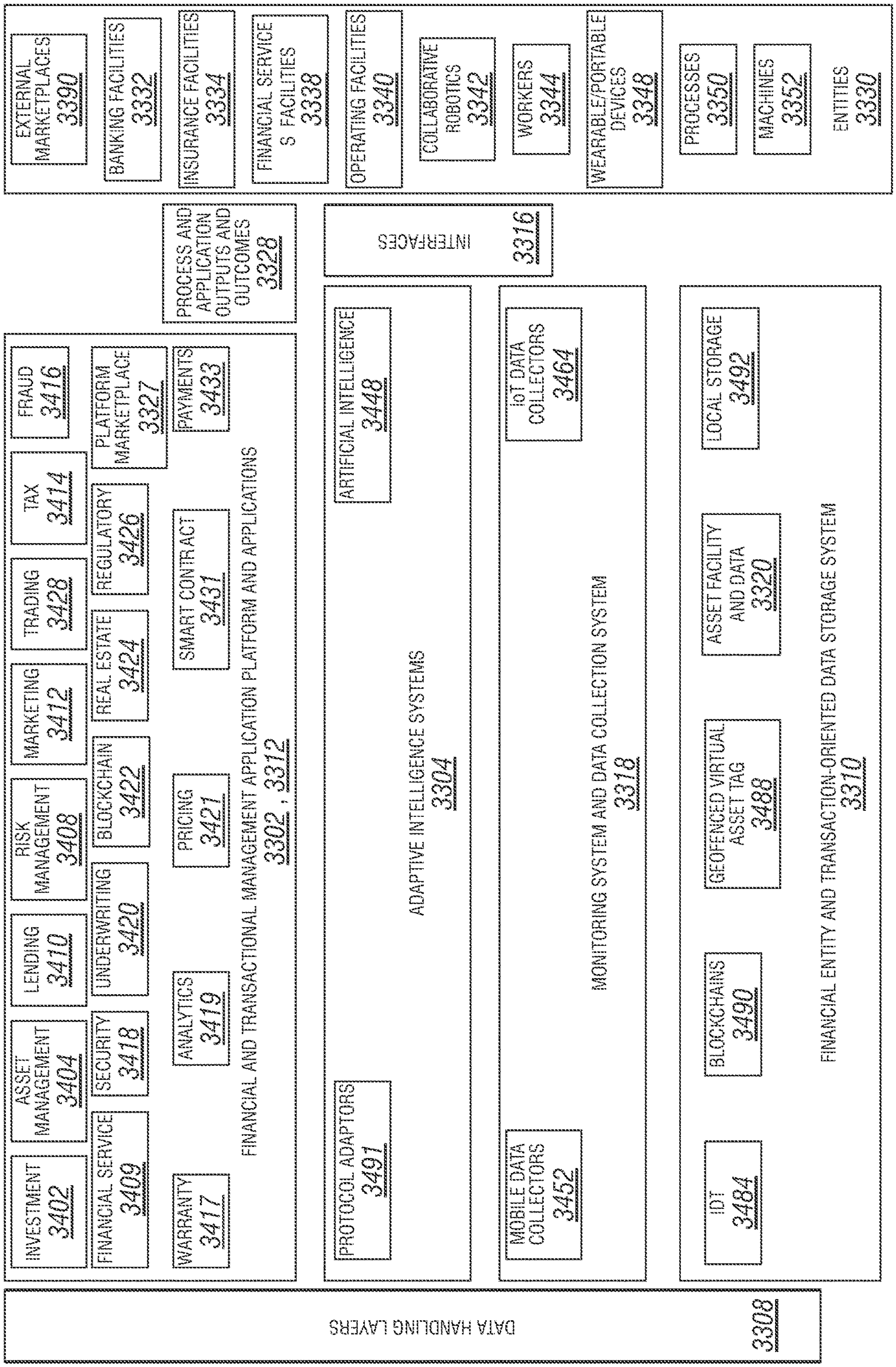
FIG. 38 depicts protocol adaptation and adaptive data storage capabilities of a transactional, financial and marketplace enablement system.

Referring to FIG. 38, additional details, components, sub-systems, and other elements of an optional embodiment of the storage layer 3310 of the transactional, financial and marketplace enablement system 3300 are illustrated, relating in particular to embodiments that may include a geofenced virtual asset tag 3488, such as for one or more assets within the asset and facility data 3320 described throughout this disclosure and the document incorporated by reference herein. In embodiments, the virtual asset tag is a data structure that contains data about an entity 3330, such as an asset (which may be physical or virtual), machine, item of equipment, item of inventory, manufactured article, certificate (such as a stock certificate), deed, component, tool, device, or worker (among others), where the data is intended to be tagged to the asset, such as where the data relates uniquely to the particular asset (e.g., to a unique identifier for the individual asset) and is linked to proximity or location of the asset (such as being geofenced to an area or location of or near the asset, or being associated with a geo-located digital storage location or defined domain for a digital asset). The virtual asset tag is thus functionally equivalent to a physical asset tag, such as an RFID tag, in that it provides a local reader or similar device to access the data structure (as a reader would access an RFID tag), and in embodiments, access control is managed as if the tag were physical located on an asset; for example, certain data may be encrypted with keys that only permit it to be read, written to, modified, or the like by an operator who is verified to be in the proximity of a tagged financial entity 3330, thereby allowing partitioning of local-only data processing from remote data processing. In embodiments, the virtual asset tag may be configured to recognize the presence of an RF reader or other reader (such as by recognition of an interrogation signal) and communicate to the reader, such as with help of protocol adaptors, such as over an RF communication link with the reader, notwithstanding the absence of a conventional RFID tag. This may occur by communications from IoT devices, telematics systems, and by other devices residing on a local area network. In embodiments, a set of IoT devices in a marketplace or financial or transactional environment can act as distributed blockchain nodes, such as for storage of virtual asset tag data, for tracking of transactions, and for validation (such as by various consensus protocols) of enchained data, including transaction history for maintenance, repair and service. In embodiments, the IoT devices in a geofence can collectively validate location and identity of a fixed asset that is tagged by a virtual asset tag, such as where peers or neighbors validate other peers or neighbors as being in a given location, thereby validating the unique identity and location of the asset. Validation can use voting protocols, consensus protocols, or the like. In embodiments, identity of the financial entities that are tagged can be maintained in a blockchain. In embodiments, an asset tag may include information that is related to a digital thread 3484, such as historical information about an asset, its components, its history, and the like.

With reference to FIG. 38, in embodiments provided herein is a transactional, financial and marketplace enablement system. An example system may include an adaptive intelligence circuit structured in interpret information from a plurality of data sources, and to interface with a plurality of management applications, wherein the adaptive intelligence circuit comprises a protocol adapter component; wherein the plurality of management applications are each associated with a separate one of a plurality of financial entities; and wherein the adaptive intelligence circuit further comprises an artificial intelligence component structured to determine an artificial intelligence process improvement for at least one of the plurality of management applications in response to the information from the plurality of data sources.

Certain further aspects of an example system are described following, any one or more of which may be present in certain embodiments. An example system may include wherein at least one of the plurality of data sources is a mobile data collector.

An example system may include wherein the adaptive intelligence circuit further comprises a protocol adapter component structured to determine a communication protocol facilitating communication between an entity accessing the at least one of the plurality of management applications having an improved process.

An example system may include wherein the entity accessing the at least one of the plurality of management applications comprises an operator related to the at least one of the plurality of management applications, and wherein the protocol adapter component is further structured to determine the communication protocol as a protocol enabling encrypted communications in response to a determination from the mobile data collector that the operator is in a proximity of a tagged financial entity.

An example system may include wherein the mobile data collector collects data from at least one geofenced virtual asset tag.

An example system may include wherein the adaptive intelligence circuit further comprises a protocol adapter component structured to determine a communication protocol facilitating communication between an entity accessing the at least one of the plurality of management applications having an improved process.

An example system may include wherein the entity accessing the at least one of the plurality of management applications comprises an operator related to the at least one of the plurality of management applications, and wherein the protocol adapter component is further structured to determine the communication protocol as a protocol enabling encrypted communications in response to a determination from the at least one geofenced virtual asset tag that the operator is in a proximity of a tagged financial entity.

An example system may include wherein at least one of the plurality of data sources is an Internet of Things data collector.

An example system may include wherein the adaptive intelligence circuit further comprises a protocol adapter component structured to determine a communication protocol facilitating communication between an entity accessing the at least one of the plurality of management applications having an improved process.

An example system may include wherein the entity accessing the at least one of the plurality of management applications comprises an operator related to the at least one of the plurality of management applications, and wherein the protocol adapter component is further structured to determine the communication protocol as a protocol enabling encrypted communications in response to a determination from the Internet of Things data collector that the operator is in a proximity of a tagged financial entity.

An example system may include wherein at least one of the plurality of data sources is a blockchain circuit, and wherein the adaptive intelligence circuit interprets the information from the blockchain circuit utilizing the adaptive intelligence circuit.

An example system may include wherein the plurality of management applications comprise at least two applications selected from the applications consisting of: an investment application, an asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprises an entity selected from the entities consisting of: an external marketplace, a banking facility, an insurance facility, a financial service facility, an operating facility, a collaborative robotics facility, a worker, a wearable device, an external process, and a machine.

An example system may include wherein the artificial intelligence component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the artificial intelligence component is further structured to determine a process improvement opportunity in response to at least one parameter selected from the parameters consisting of: a time saving value, a cost saving value, and an improved outcome value.

An example system may include wherein the plurality of management applications includes a risk management application, and wherein the adaptive intelligence circuit is further structured to automate a risk management process.

An example system may include wherein the adaptive intelligence circuit is further structured to automate the risk management process by performing at least one operation selected from the operations consisting of: utilizing data from the plurality of data sources to schedule a risk event; determining risk criteria in response to a plurality of asset data and risk outcomes, and providing a risk command in response to the plurality of asset data and risk management outcomes; and adjusting a geofencing location to provide at least one of an improved access for an operator related to at least one of the plurality of management applications or improve a security of communications to at least one of the plurality of management applications.

An example system may include wherein the adaptive intelligence circuit is further structured to automate the risk management process in response to at least one of the plurality of data sources that is not accessible to the risk management application.

An example system may include wherein the adaptive intelligence circuit is further structured to improve the process of at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the adaptive intelligence circuit is further structured to interpret an outcome from the at least one entity, and wherein the artificial intelligence component is further structured to iteratively improve the process in response to the outcome from the at least one entity.

An example system may include wherein at least one of the plurality of data sources is not accessible to each of the at least one of the plurality of management applications having an improved process by the adaptive intelligence circuit.

An example system may include wherein the at least one of the plurality of management applications having an improved process by the adaptive intelligence circuit comprises a smart contract application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the adaptive intelligence circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the adaptive intelligence circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the adaptive intelligence circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the adaptive intelligence circuit comprises a pricing management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the adaptive intelligence circuit comprises a warranty management application, and wherein the at least one of the plurality of data sources comprises at least one data source selected from the data sources consisting of: an access data source, a claims data source, a worker data source, and an event data source.

Figure 39:
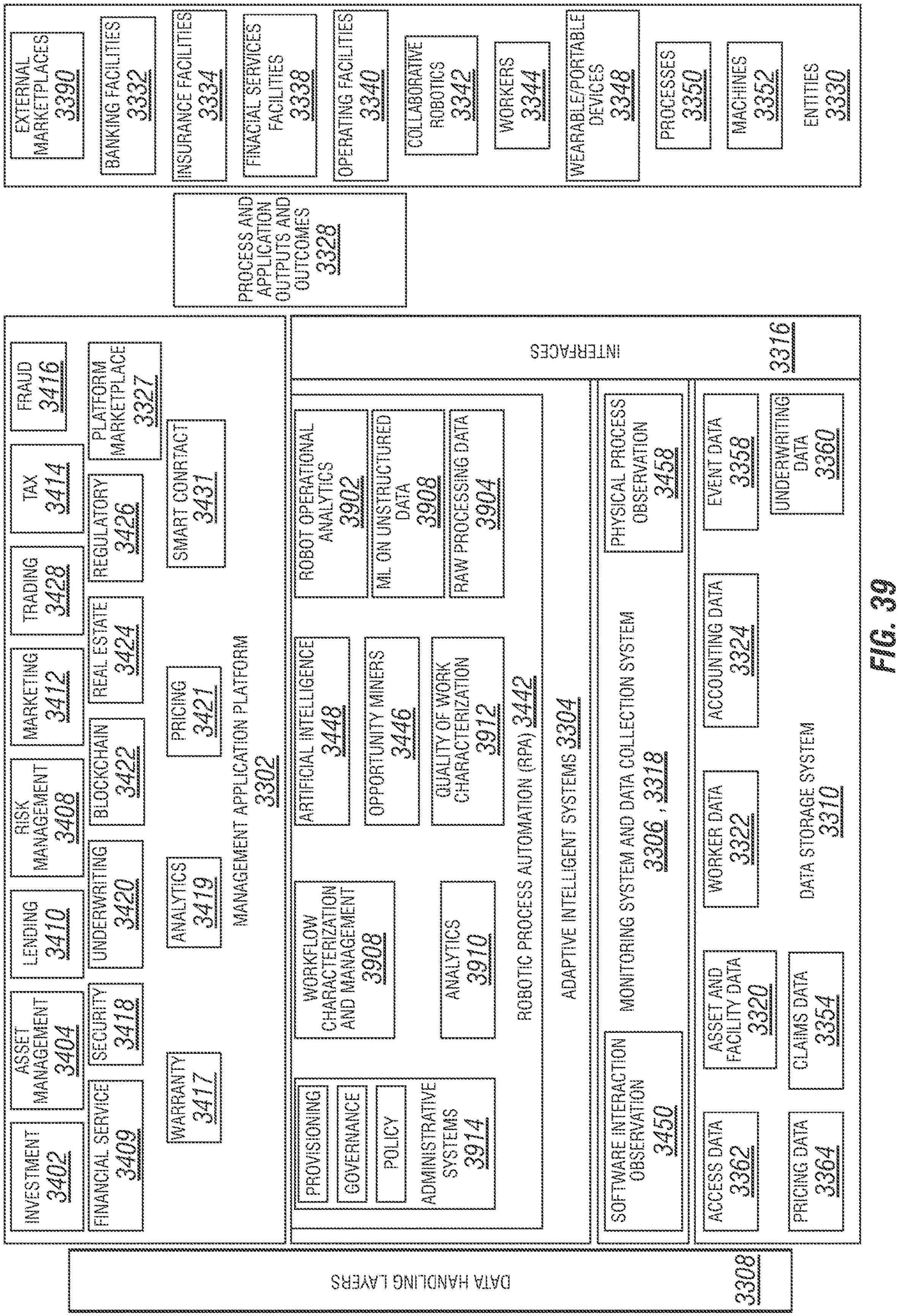
FIG. 39 depicts robotic operational analytic capabilities of a transactional, financial and marketplace enablement system.

Referring to FIG. 39, in embodiments, a unified RPA system 3442, such as for developing and deploying one or more automation capabilities may include or enable capabilities for robot operational analytics 3902, such as for analyzing operational actions of a set of robots, including with respect to location, mobility and routing of mobile robots, as well as with respect to motions of robot components, such as where robotic components are used within a wide range of protocols or procedures, such as banking processes, underwriting processes, insurance processes, risk assessment processes, risk mitigation processes, inspection processes, exchange processes, sale processes, purchase processes, delivery processes, warehousing processes, assembly processes, transport processes, maintenance and repair processes, data collection processes, and many others.

In embodiments, the RPA system 3442 may include or enable capabilities for machine learning on unstructured data 3909, such as learning on a training set of human labels, tags, or other activities that allow characterization of the unstructured data, extraction of content from unstructured data, generation of diagnostic codes or similar summaries from content of unstructured data, or the like. For example, the RPA system 3442 may include sub-systems or capabilities for processing PDFs (such as technical data sheets, functional specifications, repair instructions, user manuals and other documentation about financial entities 3330, such as machines and systems), for processing human-entered notes (such as notes involved in diagnosis of problems, notes involved in prescribing or recommending actions, notes involved in characterizing operational activities, notes involved in maintenance and repair operations, and many others), for processing information unstructured content contained on websites, social media feeds and the like (such as information about products or systems in an financial environment that can be obtained from vendor websites), and many others.

In embodiments, the RPA system 3442 may comprise a unified platform with a set of RPA capabilities, as well as systems for monitoring (such as the systems of the monitoring systems layer 3306 and data collection systems 3318), systems for raw data processing 3904 (such as by optical character recognition (OCR), natural language processing (NPL), computer vision processing, sound processing, sensor processing and the like); systems for workflow characterization and management 3908; analytics capabilities 3910; artificial intelligence capabilities 3448; and administrative systems 3914, such as for policy, governance, provisioning (such as of services, roles, access controls, and the like) among others. The RPA system 3442 may include such capabilities as a set of microservices in a microservices architecture. The RPA system 3442 may have a set of interfaces to other platform layers 3308, as well as to external systems, for data exchange, such that the RPA system 3442 can be accessed as an RPA platform-as-a-service by external systems that can benefit from one or more automation capabilities.

In embodiments, the RPA system 3442 may include a quality-of-work characterization capability 3912, such as one that identifies high quality work as compared to other work. This may include recognizing human work as different from work performed by machines, recognizing which human work is likely to be of highest quality (such as work involving the most experienced or expensive personnel), recognizing which machine-performed work is likely to be of the highest quality (such as work that is performed by machines that have extensively learned on feedback from many outcomes, as compared to machines that are newly deployed, and recognizing which work has historically provided favorable outcomes (such as based on analytics or correlation to past outcomes). A set of thresholds may be applied, which may be varied under control of a developer or other user of the RPA system 3442, such as to indicate by type, by quality-level, or the like, which data sets indicating past work will be used for training within machine learning systems that facilitate automation.

With reference to FIG. 39, in embodiments provided herein is a transactional, financial and marketplace enablement system. An example system may include an robotic process automation circuit structured in interpret information from a plurality of data sources, and to interface with a plurality of management applications; wherein the plurality of management applications are each associated with a separate one of a plurality of financial entities; and wherein the robotic process automation circuit further comprises a robot operational analytics component structured to determine a robot operational process improvement for at least one of the plurality of management applications in response to the information from the plurality of data sources.

Certain further aspects of an example system are described following, any one or more of which may be present in certain embodiments. An example system may further include an administrative system circuit structured to adapt the robot operational process improvement through at least one of governance of robotic operations, provisioning robotic operations, or robotic operations policies.

An example system may include wherein the robot operational process improvement comprises a robotic workflow characterization and improvement.

An example system may further include an opportunity mining circuit structured to adapt the operational process improvement to one of the plurality of management applications.

An example system may include wherein the robot operational process improvement comprises a robotic quality of work characterization and improvement.

An example system may include wherein the robot operational analytics component comprises a robotics machine learning component for processing the information from a plurality of data sources to determine the robot operational process improvement.

An example system may include wherein the robot operational analytics component comprises a raw data processing component for processing the information from a plurality of data sources to determine the robot operational process improvement.

An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the robot operational analytics component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the robot operational analytics component is further structured to determine a process improvement opportunity in response to at least one parameter selected from the parameters consisting of: a time saving value, a cost saving value, and an improved outcome value.

An example system may include wherein the plurality of management applications includes a regulatory management application, and wherein the robotic process automation circuit is further structured to automate a regulatory management process.

An example system may include wherein the robotic process automation circuit is further structured to automate the regulatory management process by performing at least one operation selected from the operations consisting of: utilizing data from the plurality of data sources to schedule a regulatory event; and determining regulatory criteria in response to a plurality of asset data and regulatory outcomes, and providing a regulatory command in response to the plurality of asset data and regulatory management outcomes.

An example system may include wherein the robotic process automation circuit is further structured to automate the regulatory management process in response to at least one of the plurality of data sources that is not accessible to the regulatory management application.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the robot operational analytics component is further structured to iteratively improve the process in response to the outcome from the at least one entity.

An example system may include wherein at least one of the plurality of data sources is not accessible to each of the at least one of the plurality of management applications having an improved process by the robotic process automation circuit.

An example system may include wherein the at least one of the plurality of management applications having an improved process by the robotic process automation circuit comprises an investment application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic process automation circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic process automation circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic process automation circuit comprises a pricing management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises a warranty management application, and wherein the at least one of the plurality of data sources comprises at least one data source selected from the data sources consisting of: an access data source, a claims data source, a worker data source, and an event data source.

Figure 40:
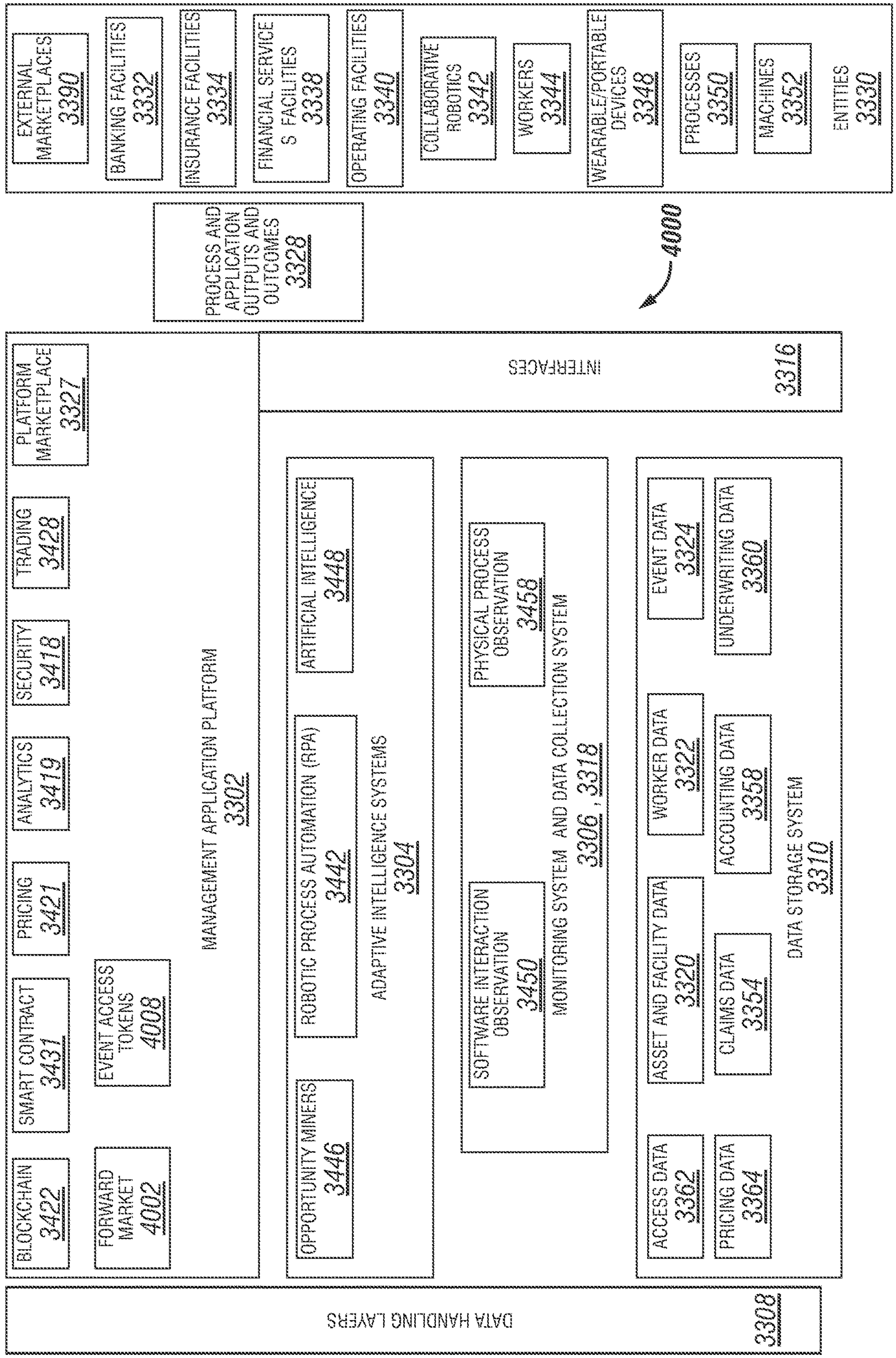
FIG. 40 depicts a blockchain and smart contract platform for a forward market for access rights to events.

Referring to FIG. 40, in embodiments, various systems, methods, processes, services, components and other elements for enabling a blockchain and smart contract platform for a forward market 4002 for access rights to events. Within a transactional enablement system such as described in connection with various embodiments of the platform 3300, a blockchain application 3422 and associated smart contract 3431 may be used to enable a forward market 4002 for access rights to events, such as where one or more event tickets, seat licenses, access rights, rights of entry, passes (e.g., backstage passes) or other items representing, comprising or embodying an access token for the right to attend, enter, view, consume, or otherwise participate in an event (which may be a live event, a recorded event, an event at a physical venue, a digital content event, or other event to which access is controlled) (all of which are encompassed by the term access token 4008 as used herein, except where context indicates otherwise) is securely stored on a blockchain that is configured by a blockchain application 3422, such as one in which the blockchain 3422 comprises a ledger of transactions in access tokens 4008 (such term comprising tickets and other evidence of the right to access the event), such as with indications of ownership (including identity information, event information, token information, information about terms and conditions, and the like) and a record of transfer of ownership (including terms, condition and policies regarding transferability). In embodiments, such a blockchain-based access token may be traded in a platform-operated marketplace application 3327, such as one configured to operate with or for a spot market or forward market 4002. In embodiments, the forward market 4002 operated within or by the platform may be a contingent forward market, such as one where a future right vests, is triggered, or emerges based on the occurrence of an event, satisfaction of a condition, or the like, such as enabled by a smart contract 3431 that operates on one or more data structures in or associated with a platform-operated marketplace 3327 or an external marketplace 3390 to execute or apply a rule, term, condition or the like, optionally resulting in a transaction that is recorded in the blockchain (such as on a distributed ledger on the blockchain), which may, in turn, initiate other processes and result in other smart contract operations. In such embodiments, a condition triggering an event may include an event promotor or other party scheduling an event having a defined set of parameters, an event arising having such parameters, or the like, and the blockchain-based access token 4008 may be configured (optionally in conjunction with a smart contract 3431 and with one or more monitoring systems 3306) to recognize the presence or existence, such as in an external marketplace 3390 of an event, or an access token to an event, that satisfies the defined set of parameters and to initiate an operation with respect to the access token, such as reporting the existence of availability of the access token, transferring access to the access token, transferring ownership, setting a price, or the like. In embodiments, monitoring system layers 3306 may monitor external marketplaces 3390 for relevant events, tokens, and the like, as well as for information indicating the emergence of conditions that satisfy one or more conditions that result in triggering, vesting, or emergence of a condition that impacts an access token or event. As an illustrative example, a sporting event access token 4008 to a playoff game may be configured to vest upon the presence of a specific team in a specific game (e.g., the Super Bowl), at which point the right to a ticket to a specific seat may be automatically allocated on a distributed ledger, enabled by a blockchain, to the individual listed on the ledger as having the right to the ticket for that team. Thus, a distributed ledger or other blockchains 3422 may securely maintain multiple prospective owners for an event token 4008 for the same event, provided access rights can be divided such that they are mutually exclusive but can be designated to a specific owner upon the emergence of a condition (e.g., a particular seat at a game, concert, or the like) and allocate ownership to a specific owner based on upon the emergence of a condition that determines which prospective owner has the right to become the actual owner (e.g., that owner's team makes it to the game). In the example of a sports league, the blockchain can thus maintain as many owners as there are mutually exclusive conditions for a seat (e.g., by allocating seats across all teams in a conference for the Super Bowl, or all teams in a division for a college football conference final). The defined set of parameters may include location (where an as-yet-unscheduled event takes place), participants (teams, individuals, and many others), prices (such as the access token is priced below a defined threshold), timing (such as a span of hours, days, months, years, or other periods), type of event (sports, concerts, comedy performances, theatrical performances, political events, and many others) and others. In embodiments, one or more monitoring system layers 3306 or other data collection systems may be configured to monitor one or more external marketplaces 3390 or platform-operated marketplaces (such as on e-commerce websites and applications, auction sites and applications, social media sites and applications, exchange sites and applications, ticketing sites and applications, travel sites and applications, hospitality sites and applications, concert promotional sites and applications, or other sites or applications) or other entities for indicators of available events, for prospective conditions that can be used to define potentially divisible or mutually exclusive access right conditions (such as for identifying events that can be configured on a multiparty distributed ledger with conditional access distributed across different prospective owners, optionally conducted via one or more opportunity miners 3446) and for actual conditions that may trigger distribution of rights to a specific owner based on the conditions. Thus, the blockchain may be used to make a contingent market in any form of event or access token by securely storing access rights on a distributed ledger, and the contingent market may be automated by configuring data collection and a set of business rules that operate upon collected data to determine when ownership rights should be vested, transferred, or the like. Post-vesting of a contingency (or set of contingencies), the access token may continue to be traded, with the blockchain providing a secure method of validating access. Security may be provided by encryption of the chain as with cryptocurrency tokens (and a cryptocurrency token may itself comprise a forward-market cryptocurrency token for event access), with proof of work, proof of stake, or other methods for validation in the case of disputes.

In embodiments, the platform 400 may include or interact with various applications, services, solutions or the like, such as those described in connection with the platform 3300, such as pricing applications 3421 (such as for setting and monitoring pricing for contingent access rights, underlying access rights, tokens, fees and the like), analytics solutions 3419 (such as for monitoring, reporting, predicting, and otherwise analyzing all aspects of the platform 4000, such as to optimize offerings, timing, pricing, or the like, to recognize and predict patterns, to establish rules and contingencies, to establish models or understanding for use by humans or by machine learning system, and for many other purposes), trading applications 3428 (such as for trading or exchanging contingent access rights or underlying access rights or tokens), security applications 3418, or the like.

With reference to FIG. 40, in embodiments provided herein is a transactional, financial and marketplace enablement system. An example system may include an robotic process automation circuit structured in interpret information from a plurality of data sources, and to interface with a plurality of management applications; wherein the plurality of management applications are each associated with a separate one of a plurality of financial entities; and wherein the robotic process automation circuit further comprises an opportunity mining component structured to determine a robot operational process improvement for at least one of the plurality of management applications in response to the information from the plurality of data sources.

Certain further aspects of an example system are described following, any one or more of which may be present in certain embodiments. An example system may further include a data collection circuit structured to collect and record physical process observation data, wherein the physical process observation data is one of the plurality of data sources.

An example system may further include a data collection circuit structured to collect and record software interaction observation data, wherein the software interaction observation data is one of the plurality of data sources.

An example system may include wherein the plurality of management applications comprise at least two applications selected from the applications consisting of: a forward market application, an event access tokens application, a security application, a blockchain application, a platform marketplace application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the opportunity mining component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the opportunity mining component is further structured to determine a process improvement opportunity in response to at least one parameter selected from the parameters consisting of: a time saving value, a cost saving value, and an improved outcome value.

An example system may include wherein the plurality of management applications includes a trading management application, and wherein the robotic process automation circuit is further structured to automate a trading management process.

An example system may include wherein the robotic process automation circuit is further structured to automate the trading management process by performing at least one operation selected from the operations consisting of: utilizing data from the plurality of data sources to schedule a trading event; and determining trading criteria in response to a plurality of asset data and trading outcomes, and providing a trading command in response to the plurality of asset data and trading management outcomes.

An example system may include wherein the robotic process automation circuit is further structured to automate the trading management process in response to at least one of the plurality of data sources that is not accessible to the trading management application.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the opportunity mining component is further structured to iteratively improve the process in response to the outcome from the at least one entity.

An example system may include wherein at least one of the plurality of data sources is not accessible to each of the at least one of the plurality of management applications having an improved process by the robotic process automation circuit.

An example system may include wherein the at least one of the plurality of management applications having an improved process by the robotic process automation circuit comprises a forward market application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic process automation circuit comprises an event access tokens management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic process automation circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises a blockchain management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic process automation circuit comprises a pricing management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises an analytics management application, and wherein the at least one of the plurality of data sources comprises at least one data source selected from the data sources consisting of: an access data source, a claims data source, a worker data source, and an event data source.

Figure 41:
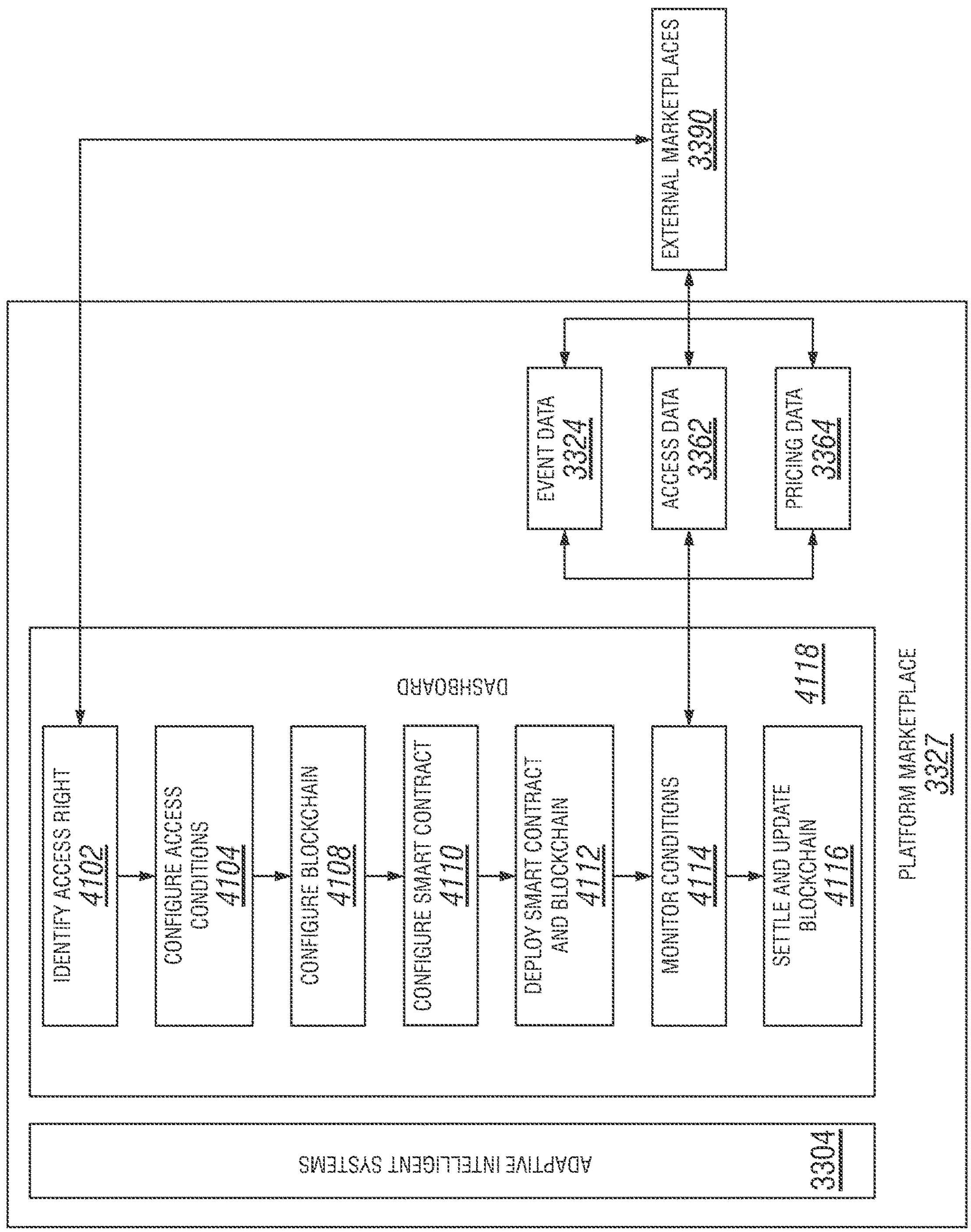
FIG. 41 depicts an algorithm and a dashboard of a blockchain and smart contract platform for a forward market for access rights to events.

Referring to FIG. 41, a platform-operated marketplace 3327 for a forward market to access rights to one or more events may be configured, such as in a dashboard 4118 or other user interface for an operator of the platform-operated marketplace 3327, using the various enabling capabilities of the data handling transactional, financial and marketplace enablement system 3300 described throughout this disclosure. The operator may use the user interface or dashboard 4118 to undertake a series of steps to perform or undertake an algorithm to create a contingent forward market event access right token as described in connection with FIG. 40. In embodiments, one or more of the steps of the algorithm to create a contingent forward market event access right token within the dashboard 4118 may include identifying one or more access rights for one or more events at a component 4102 to identify access rights, such as by monitoring one or more platform-operated marketplaces 3327 or external marketplaces 3390 for messages, announcements, or other data indicative of the event or access right. The dashboard 4118 may be configured with interface elements (including application programming elements) that allow the event to be imported into the platform-operated marketplace 3327, such as by linking to the environment where the access right is offered or maintained, which may include using APIs for backend ticketing systems and the like. In the dashboard 4118, at a component 4104, one or more conditions (of the type described herein) for the access right may be configured (e.g., by interfacing with a user), such as by defining a set of mutually exclusive conditions that, upon triggering, allocate the access right to different individuals or entities. The user interface of the dashboard 4118 may include a set of drop-down menus, tables, forms, or the like with default, templated, recommended, or pre-configured conditions, such as ones that are appropriate for various types of access rights. For example, access rights to a playoff game for a sporting event can be preconfigured to set an access condition as the presence of a specific team in the playoff game, where the team is a member of the set of teams that could be in the game, and access rights are allocated to a given seat across mutually exclusive possible teams that could make it to the game (e.g., the teams in one conference for the Super Bowl). As another example, access rights to an as-yet-unplanned entertainment event could be preconfigured to set conditions such as a venue, a span of dates and a selected entertainer or group. Once the conditions and other parameters of the access rights are configured, at a component 4108 a blockchain may be configured to maintain, such as via a ledger, the data required to provision, allocate, and exchange ownership of the contingent access rights (and optionally the underlying access tokens to which the contingent access rights relate). For example, a ticket to a game may be stored as a cryptographically secure token on the ledger, and another token may be created and stored on the blockchain for each contingent access right that could result in the ownership of the ticket. The blockchain may be configured to store tokens, identity information, transaction information (such as for exchanges of contingent rights and/or underlying tokens) and other data. At a component 4110 a smart contract 3431 may be configured to embody the conditions that were configured at the component 4104, and to operate on the blockchain that was created at the component 4108 as well as to operate on other data, such as data indicating facts, conditions, events, or the like in the platform-operated marketplace 3327 and/or an external marketplace 3390. The smart contract may be configured at a component 4110 to apply one or more rules, execute one or more conditional operations, or the like upon data that may include event data 3324, access data 3362, pricing data 3364 or other data about or relevant to access rights. Once configuration of one or more blockchains and one or more smart contracts is complete, at a component 4112 the blockchain and smart contract may be deployed in the platform-operated marketplace, such as for interaction by one or more consumers or other users, who may, such as in a marketplace interface, such as a website, application, or the like, enter into the smart contract, such as by purchasing a contingent right to a future event, at which point the platform, such as using the adaptive intelligent systems layer 3304 or other capabilities, may store relevant data, such as pricing data and identity data for the party or parties entering the smart contract on the blockchain or otherwise on the platform 3300. At a component 4114, once the smart contract is executed, the component 4114 may monitor, such as by the monitoring systems layer 3306, the platform-operated marketplace 3327 and/or one or more external marketplaces 3390 for event data 3324, access data 3362, pricing data 3364 or other data, such as events, that may satisfy one or more conditions or trigger application of one or more rules of the smart contract. For example, results of games or announcements of future entertainment events may be monitored, and smart contract conditions may be satisfied. At a component 4116, upon satisfaction of conditions, smart contracts may be settled, executed, or the like, resulting updates or other operations on the blockchain, such as by transferring ownership of underlying access tokens and/or contingent access tokens. Thus, via operation of the above-referenced components, an operator of the platform-operated marketplace 3327 may discover, configure, deploy, and have executed a set of smart contracts that offer and deliver contingent access to future events that are cryptographically secured and transferred on a blockchain to consumers or others. In embodiments, the adaptive intelligent systems layer 3304 may be used to monitor the steps of the algorithm described above, and one or more artificial intelligence systems may be used to automated, such as by robotic process automation, the entire process or one or more sub-steps or sub-algorithms. This may occur as described above, such as by having an artificial intelligence system learn on a training set of data resulting from observations, such as monitoring software interactions, of human users as they undertake the above-referenced steps. Once trained, the adaptive intelligent systems layer 3304 may thus enable the transactional, financial and marketplace enablement system 3300 to provide a fully automated platform for discovery and delivery of contingent access rights to future events.

Figure 42:
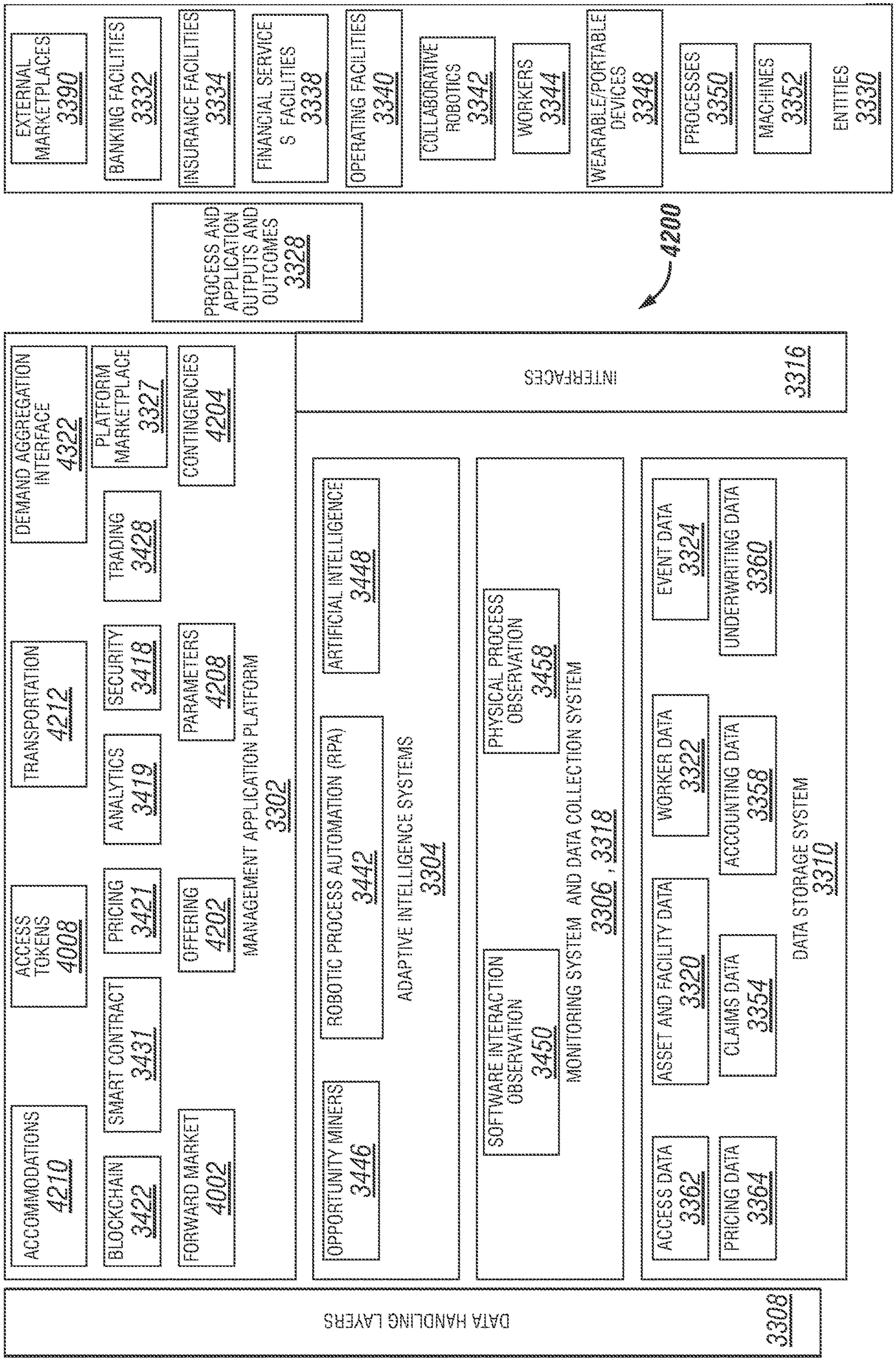
FIG. 42 depicts a blockchain and smart contract platform for forward market demand aggregation.

Referencing FIG. 42, in embodiments, a platform is provided herein, with systems, methods, processes, services, components and other elements for enabling a blockchain and smart contract platform for forward market demand aggregation 4002. In this case, a demand aggregation blockchain and smart contract platform 4200, having various features and enabled by capabilities similar to those described in connection with the transactional, financial and marketplace enablement system 3300 and the platform 4000 as described above may be based on a set of contingencies 4204 that influence or represent future demand for an offering 4202, which may comprise a set of products, services, or the like (which may include physical goods, virtual goods, software, physical services, software, access rights, entertainment content, or many other items). A blockchain 3422, such as enabling distributed ledger, may record indicators of interest from a set of parties with respect to the product, service, or the like, such as ones that define parameters under which the party is willing to commit to purchase the product or service. Interest may be expressed or committed in a demand aggregation interface 4322, which may be included in or associated with one or more sites, applications, communications systems, or the like, which may be independently operated or may comprise aspects of a platform-operated marketplace 3327 or an external marketplace 3390. Commitments may be taken and administered via a smart contract 3431 or other transaction mechanisms. These commitments may include various parameters 4208, such as parameters of price, technical specification (e.g., shoe size, dress size, or the like for clothing, or performance characteristics for information technology, such as bandwidth, storage capacity, pixel density, or the like), timing, and many others for one or more desired offerings 4202. The blockchain 3422 may thus be used to aggregate future demand in a forward market 4002 with respect to a variety of products and services and may be processed by manufacturers, distributors, retailers, and others to help plan for the demand, such as for assistance (optionally in an analytics system 3419 with pricing, inventory management, supply chain management, smart manufacturing, just-in-time manufacturing, product design and many other activities). The offering 4202, whether a product, service, or other item, need not exist at the time a set of parameters 4208 are configured; for example, an individual can indicate a willingness to pay up to $1000 for a 65 inch, 32K quantum dot television display on or before Jan. 1, 2022. In embodiments, a vendor can offer a range of potential configurations and conditions with respect to which consumers can indicate interest, and optionally commit to purchase within defined conditions. In embodiments, consumers may present desired items and configurations. In embodiments, an artificial intelligence system, which may be a rule-based system, such as enabled by an adaptive intelligent systems layer 3304, may process a set of potential configurations having different parameters 4208 for a subset of configurations that are consistent with each other (e.g., all have 4K or greater capability and all are priced below $500), and the subset of configurations may be used to aggregate committed future demand for the offering that satisfies a sufficiently large subset at a profitable price. In embodiments, the adaptive intelligent systems 3204 may use a fuzzy logic system, a self-organizing map, or the like to group potential configurations, such that a human expert may determine a configuration that is near enough to ones that have been identified, such that it can be presented as a new alternative. In embodiments, an artificial intelligence system 3448 may be trained to learn to determine and present new configurations for offerings 4202 based on a training data set created by human experts.

In embodiments, a platform 4200 is provided herein, with systems, methods, processes, services, components, and other elements for enabling a blockchain and smart contract platform for forward market rights for accommodations. An accommodation offering 4210 may comprise a combination of products, services, and access rights that may be handled as with other offerings, including aggregation demand for the offering 4210 in a forward market 4002. In embodiments, the forward market capabilities noted above may include access tokens 4008 for accommodations, as well as future accommodations, such as hotel rooms, shared spaces offered by individuals (e.g., Airbnb™ spaces), bed-and-breakfasts, workspaces, conference rooms, convention spaces, fitness accommodations, health and wellness accommodations, dining accommodations, and many others. Accommodations offerings 4210 may be linked to other access tokens 4008, such as in packages; for example, a hotel room in a city within walking distance of a sporting event may be linked by or on the same blockchain or linked blockchains (e.g., by linking ownership or access rights to both on the same ledger), so that when a condition is met (e.g., a fan's team makes it to the Super Bowl), vesting of ownership of the access token to the event also automatically establishes (and optionally automatically initiates, such as via an application programming interface of the platform) the right to the accommodation (such as by booking a hotel room and dining reservations). Thus, the forward market for the event may enable a convenient, secure forward market, enabled by automatic processing on the blockchain for packages of event access tokens, accommodations, and other elements. In embodiments, accommodations may be provided with configured forward market parameters 4208 (including conditional parameters) apart from access tokens 4008 to events, such as where a hotel room or other accommodation is booked in advance upon meeting a certain condition (such as one relating to a price within a given time window). For example, an accommodation offering 4210 at a four-star hotel during a music festival could be pre-configured to be booked if and when the accommodation (e.g., a room with a king bed and a city view) becomes available within a given time window. Thus, demand for accommodations can be aggregated in advance and conveniently fulfilled by automatic recognition (such as by monitoring systems 3306) of conditions that satisfy pre-configured commitments represented on a blockchain (e.g., distributed ledger) and automatic initiation (optionally including by smart contract execution) of settlement or fulfillment of the demand (such as by automated booking of a room or other accommodations).

In embodiments, a platform is provided herein, with systems, methods, processes, services, components, and other elements for enabling a blockchain and smart contract platform for forward market rights to transportation. As with accommodations, transportation offerings 4212 may be aggregated and fulfilled, with a wide range of pre-defined contingencies, using the platform 4200. As with accommodations offerings 4210, transportation offerings 4212 can be linked to other access tokens 4008 (such as event tickets, accommodations, services, and the like), such as where a flight is automatically booked at or below a predefined price threshold if and when the fan's team makes it to the Super Bowl, among many other examples. Transportation offerings 4212 can also be offered separately (such as where travel is automatically booked based on a commitment, in a distributed ledger, to buy a ticket if it is offered within a given time window at a given price). As with other goods and services, aggregation on the blockchain 3422, such as a distributed ledger, can be used for demand planning, for determining what resources are deployed to what routes or types of travel, and the like. Transportation offerings 4212 can be configured, with predefined contingencies 4204 and parameters 4208, such as with respect to price, mode of transportation (air, bus, rail, private car, ride share or other), level of service (e.g., First Class, business class, or other), mode of payment (e.g., use of loyalty programs, rewards points, or particular currencies, including cryptocurrencies), timing (e.g., defined time period or linked to an event, location (e.g., specified to be where a given type of event takes place (such as this year's Super Bowl) or a specific location), route (e.g., direct or multi-stop, from the destination of the consumer to a specific location or to wherever an event takes place), and many others.

In embodiments, the platform 4200 may include or interact with various applications, services, solutions or the like, such as those described in connection with the platform 3300, such as pricing applications 3421 (such as for setting and monitoring pricing for goods, services, access rights, tokens, fees and other items), analytics solutions 3419 (such as for monitoring, reporting, predicting, and otherwise analyzing all aspects of the platform 4000, such as to optimize offerings, timing, pricing, or the like, to recognize and predict patterns, to establish rules and contingencies, to establish models or understanding for use by humans or by machine learning system, and for many other purposes), trading applications 3428 (such as for trading or exchanging contingent access rights, futures or options for goods, services, or other offerings 4202, tokens and other items), security applications 3418, or the like.

Figure 43:
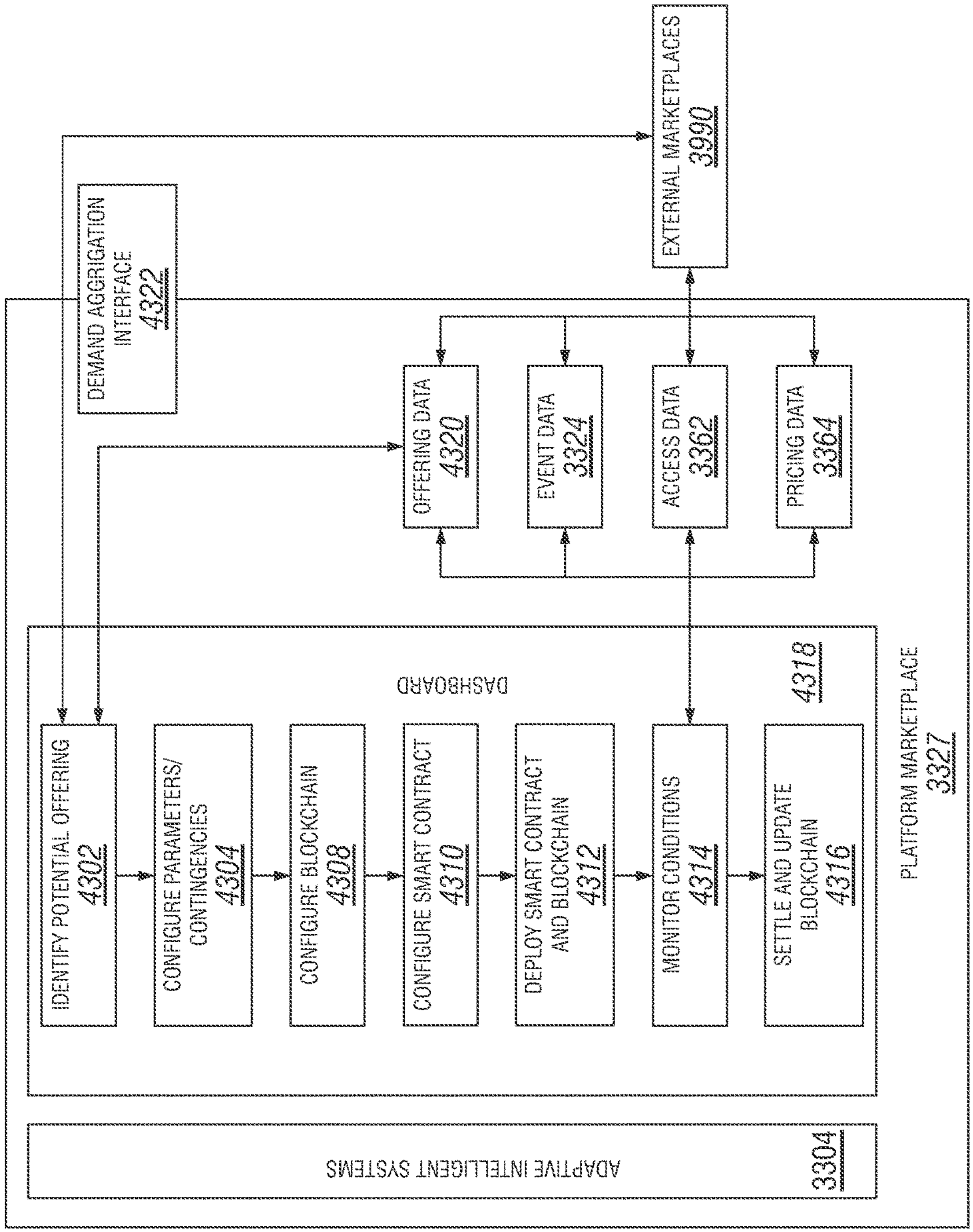
FIG. 43 depicts an algorithm and a dashboard of a blockchain and smart contract platform for forward market demand aggregation.

Referring to FIG. 43, a platform-operated marketplace 3327 for a forward market to future offerings 4202 may be configured, such as in a dashboard 4318 or other user interface for an operator of the platform-operated marketplace 3327, using the various enabling capabilities of the data handling platform 3300 described throughout this disclosure. The operator may use the user interface or dashboard 4318 to undertake a series of steps to perform or undertake an algorithm to create an offering 4210 as described in connection with FIG. 42. In embodiments, one or more of the steps of the algorithm to create a contingent future offering 4210 within the dashboard 4318 may include, at a component 4302, identifying offering data 4320, which may come from a platform-operated marketplace 3327 or an external marketplace 3390, such as via a demand aggregation interface 4322 presented to one or more consumers within one of them, or may be entered via a user interface of or at a site or application that is created for demand aggregation for offerings 4210, such as via solicitation of consumer interest or consumer commitments (such as commitments entered into by smart contracts) based on specification of various possible parameters 4208 and contingencies 4204 for such offerings 4210.

The dashboard 4318 may be configured with interface elements (including application programming elements) that allow an offering to be managed in the platform-operated marketplace 3327, such as by linking to the set of environments where various components of the offering 4202, such as descriptions of goods and services, prices, access rights and the like are specified, offered or maintained, which may include using APIs for backend ticketing systems, e-commerce systems, ordering systems, fulfillment systems, and the like. In the dashboard 4318, a component 4304 may configure one or more parameters 4208 or contingencies 4204 (e.g., via interactions with a user), such as comprising or describing the conditions (of the type described herein) for the offering, such as by defining a set of conditions that trigger the commitment by a consumer to partake of the offering 4202, that trigger the right to an allocation of the offering, or the like. The user interface of the dashboard 4318 may include a set of drop down menus, tables, forms, or the like with default, templated, recommended, or preconfigured conditions, parameters 4208, contingencies 4204 and the like, such as ones that are appropriate for various types of offerings 4202. For example, access rights to a new line of shoes can be preconfigured to set an offering condition as the offering of a shoe by a certain designer of a certain style and color and may be preconfigured to accept a commitment to buy the shoe if the access is provided below a certain price during a certain time period. As another example, demand for an as-yet-unplanned entertainment event can be preconfigured to set conditions such as a venue, a span of dates and a selected entertainer or group. Once the conditions and other parameters of the offering 4202 are configured, a component 4308 may configure a blockchain to maintain, such as via a ledger, the data required to provision, allocate, and exchange ownership of items comprising the offering (and optionally underlying access tokens, virtual goods, digital content items, or the like that are included in or associated with the offering). For example, a virtual good for a video may be stored as a cryptographically secure token on the ledger, and another token may be created and stored on the blockchain for each contingent access right that could result in the ownership of the virtual good or each smart contract to purchase the virtual good if and when it becomes available under defined conditions. The blockchain may be configured to store tokens, identity information, transaction information (such as for exchanges of contingent rights and/or underlying tokens), virtual goods, license keys, digital content, entertainment content, and other data. A component 4310 may configure a smart contract 3431 to embody the conditions that were configured at the component 4304 and to operate on the blockchain that was created at the component 4308 as well as to operate on other data, such as data indicating facts, conditions, events, or the like in the platform-operated marketplace 3327 and/or an external marketplace 3390. The smart contract may be configured at the step 4310 to apply one or more rules, execute one or more conditional operations, or the like upon data that may include offering data 4320, event data 3324, access data 3362, pricing data 3364 or other data about or relevant to a set of offerings 4202. Once configuration of one or more blockchains and one or more smart contracts is complete, at a component 4312 the blockchain and smart contract may be deployed in the platform-operated marketplace 3327, such as for interaction by one or more consumers or other users, who may, such as in a marketplace interface or a demand aggregation interface 4322, such as a website, application, or the like, enter into the smart contract, such as by executing an indication of a commitment to purchase, attend, or otherwise consume the future offering 4202, at which point the platform, such as using the adaptive intelligent systems layer 3304 or other capabilities, may store relevant data, such as pricing data and identity data for the party or parties entering the smart contract on the blockchain or otherwise on the platform 3300. At a component 4314, once the smart contract is executed, the platform may monitor, such as by the monitoring systems layer 3306, the platform-operated marketplace 3327 and/or one or more external marketplaces 3390 for offering data 4320, event data 3324, access data 3362, pricing data 3364 or other data, such as events, that may satisfy one or more conditions or trigger application of one or more rules of the smart contract. For example, announcements of offerings may be monitored, such as on e-commerce sites, auction sites, or the like, and smart contract conditions may be satisfied by one or more of the offerings 4202.

At a component 4316, upon satisfaction of conditions, smart contracts may be settled, executed, or the like, resulting updates or other operations on the blockchain, such as by transferring ownership of goods, services, underlying access tokens and/or contingent access tokens and transferring required consideration (such as obtained by a payments system). Thus, via the above-referenced steps, an operator of the platform-operated marketplace 3327 may discover, configure, deploy, and have executed a set of smart contracts that aggregate demand for, and offer and deliver contingent access to, offerings 4202 that are cryptographically secured and transferred on a blockchain to consumers or others. In embodiments, the adaptive intelligent systems layer 3304 may be used to monitor the steps of the algorithm described above, and one or more artificial intelligence systems may be used to automated, such as by robotic process automation, the entire process or one or more sub-steps or sub-algorithms. This may occur as described above, such as by having an artificial intelligence system learn on a training set of data resulting from observations, such as monitoring software interactions, of human users as they undertake the above-referenced steps. Once trained, the adaptive intelligent systems layer 3304 may thus enable the platform 3300 to provide a fully automated platform for discovery and delivery of offerings, as well as demand aggregation for such offerings 4202 and automated handling of access to and ownership of such offerings 4202.

Figure 44:
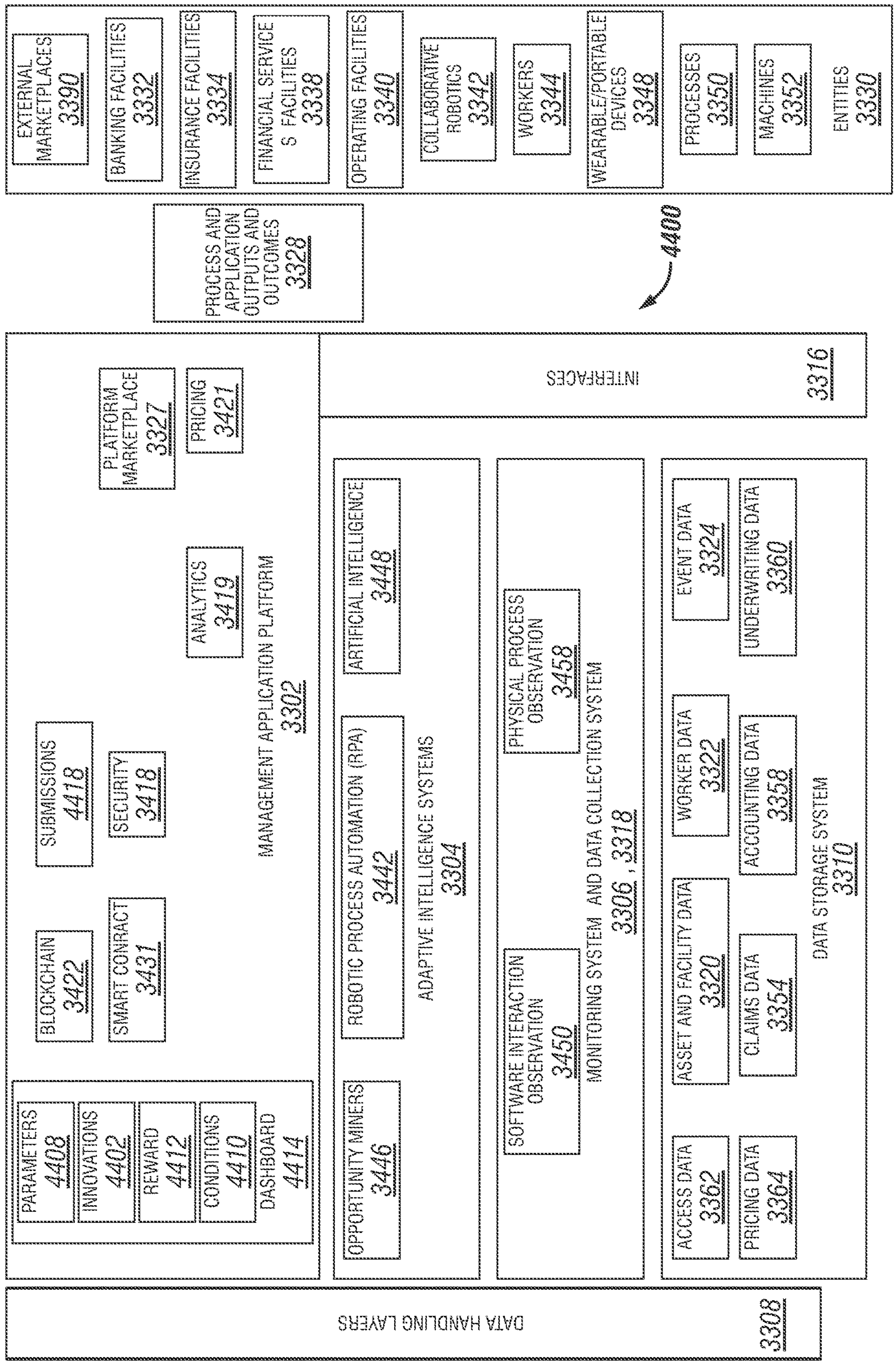
FIG. 44 depicts a blockchain and smart contract platform for crowdsourcing for innovation.

Referring to FIG. 44, in embodiments, a platform is provided herein, with systems, methods, processes, services, components and other elements for enabling a blockchain and smart contract platform 4400 for crowdsourcing for innovation. In such embodiments, a party seeking a set of innovations 4402, such as inventions, works of authorship, innovations, technology solutions to a set of problems, satisfaction of a technical specification, or other advancement may configure, such as on a blockchain 3422 (optionally comprising a distributed ledger), a set of conditions 4410, capable of being expressed in a smart contract 3431, that are required to satisfy the requirement. A reward 4412 may be configured for generating an innovation 4402 of a given set of capabilities or satisfying a given set of parameters 4408 by a given date (e.g., a technical specification for a 5G foldable phone that can be produced for less than $100 per unit before the end of 2019). Satisfaction of the conditions 4410 may be measured by a monitoring system 3306, by one or more experts, or by a trained artificial intelligence system 3448 (such as one trained to evaluate responses based on a training set created by experts). In embodiments, the blockchain and smart contract platform 4400 may include a dashboard 4414 for configuration of the specification, requirements or other conditions 4410, the reward 4412, timing and other parameters 4408 (such as any required qualifications, formats, geographical requirements, certifications, credentials, or the like that may be required of a submission or a submitter), and the blockchain and smart contract platform 4400 may automatically configure a blockchain 3422 to store the parameters 4408 and a smart contract 3431 to operate, such as in coordination with a website, application, or other marketplace environments, to offer the reward 4412, receive and record submissions 4418 (such as on the blockchain 3422), allocate rewards 4412, and the like, with events, transactions, and activities being recorded in blockchain, optionally using a distributed ledger. In embodiments, rewards 4412 may be configured to be allocated across multiple submissions, such as where an innovation requires solution of multiple problems, such that submissions 4418 may be evaluated for satisfaction of some conditions and rewards may be allocated among contributing submissions 4418 when and if a complete solution (comprising aggregation of multiple submissions 4418) is achieved, unlocking the reward, at which point the contributing submissions 4418 recorded on the distributed ledger may be allocated appropriate portions of the reward. Submissions may include software, technical data, know how, algorithms, firmware, hardware, mechanical drawings, prototypes, proof-of-concept devices, systems, and many other forms, which may be identified, described, or otherwise documented on the blockchain 3422 (e.g., distributed ledger), such as by one or more links to one or more resources (which may be secured by cryptographic or other techniques). Submissions may thus be described and evaluated for purposes of allocation of rewards 4412 (such as by one or more independent experts, by artificial intelligence systems (which may be trained by experts) or the like), then locked, such as by encryption, secure storage, or the like, unless and until a reward is distributed via the distributed ledger. Thus, the platform provides a secure system for exchange of information related to innovation that is provided for rewards, such as in crowdsourcing or other innovation programs. An artificial intelligence system 3448 may be trained, such as by a training set of data using interactions of experts with submissions 4418, to automatically evaluate submissions 4418, for either automatic allocation of rewards or to pre-populate evaluation for confirmation by human experts. In embodiments, an artificial intelligence system 3448 may be trained, such as by a training set of data reflecting expert interactions with the dashboard 4414, optionally coupled with outcome information, such as from analytics system 3419, to create rewards 4412, set conditions 4410, specify innovations 4402, and set other parameters 4408, thereby providing a fully automated or semi-automated capability for one or more of those capabilities.

Figure 45:
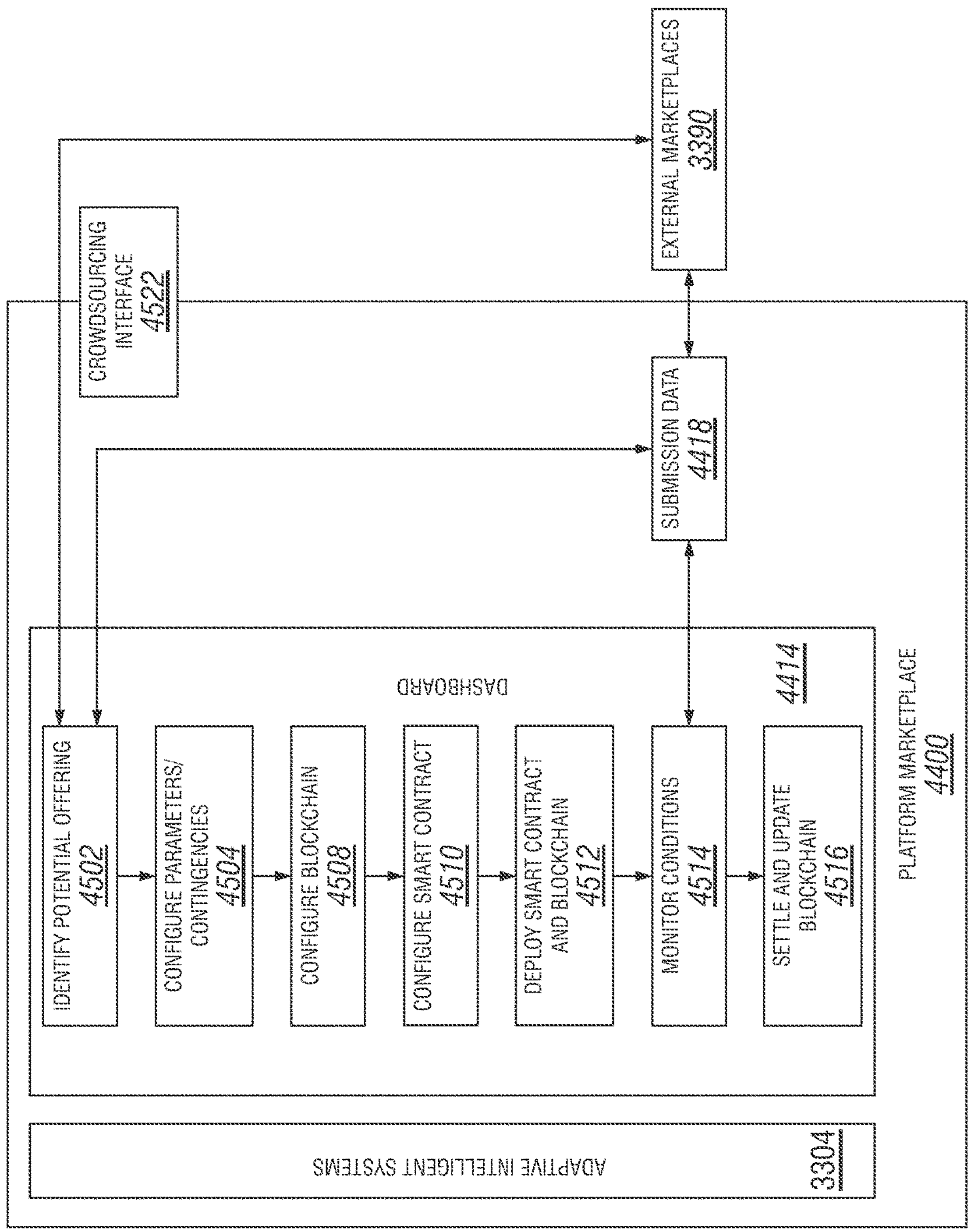
FIG. 45 depicts an algorithm and a dashboard of a blockchain and smart contract platform for crowdsourcing for innovation.

Referring to FIG. 45, a platform-operated marketplace 3327 for crowdsourcing innovation 4402 may be configured, such as in a crowdsourcing dashboard 4414 or other user interface for an operator of the platform-operated marketplace 3327, using the various enabling capabilities of the data handling platform 3300 described throughout this disclosure. The operator may use the user interface or crowdsourcing dashboard 4414 to undertake a series of steps to perform or undertake an algorithm to create crowdsourcing offers as described in connection with FIG. 44. In embodiments, one or more of the components depicted are configured to create a reward 4412 within the dashboard 4414 which may include, at a component 4502, identifying potential offers, such as what innovations 4402 are of interest (such as may be indicated by indications of demand in a platform-operated marketplace 3327 or an external marketplace 3390, or by indications by stakeholders for an enterprise through various communication channels).

The dashboard 4414 may be configured with a crowdsourcing interface 4512, such as with elements (including application programming elements) that allow a crowdsourcing offering to be managed in the platform-operated marketplace 3327 and/or in one or more external marketplaces 3390. In the dashboard 4414, at a component 4504, the user may configure one or more parameters 4408 or conditions 4410, such as comprising or describing the conditions (of the type described herein) for the crowdsourcing offer, such as by defining a set of conditions 4410 that trigger the reward 4412 and determine allocation of the reward 4412 to a set of submitters. The user interface of the dashboard 4414 may include a set of drop-down menus, tables, forms, or the like with default, templated, recommended, or pre-configured conditions, parameters 4408, conditions 4410 and the like, such as ones that are appropriate for various types of crowdsourcing offers. Once the conditions and other parameters of the offer are configured, at a component 4508, a smart contract 3431 and blockchain 3422 may be configured to maintain, such as via a ledger, the data required to provision, allocate, and exchange data related to the offer. The blockchain may be configured to store tokens, identity information, transaction information (such as for exchanges of information), technical descriptions, virtual goods, license keys, digital content, entertainment content, and other data, content or information that may be relevant to a submission 4418 or a reward 4412. At a component 4510, a smart contract 3431 may be configured to embody the conditions that were configured at the step 4504 and to operate on the blockchain that was created at the component 4508 as well as to operate on other data, such as data indicating facts, conditions, events, or the like in the platform-operated marketplace 3327 and/or an external marketplace 3390, such as ones related to submission data 4418. The smart contract 3431 may be responsive to the component 4510 to apply one or more rules, execute one or more conditional operations or the like upon data, such as submission data 4418 and data indicating satisfaction of parameters or conditions, as well as identity data, transactional data, timing data, and other data. Once configuration of one or more blockchains and one or more smart contracts is complete, at a component 4512, the blockchain and smart contract may be deployed in the platform-operated marketplace 3327, external marketplace 3390 or other environment, such as for interaction by one or more submitters or other users, who may, such as in a crowdsourcing interface 4512, such as a website, application, or the like, enter into the smart contract, such as by submitting a submission 4418 and requesting the reward 4412, at which point the platform, such as using the adaptive intelligent systems layer 3304 or other capabilities, may store relevant data, such as submission data 4418, identity data for the party or parties entering the smart contract on the blockchain, or otherwise on the platform 3300. At a component 4514, once the smart contract is executed, the platform may monitor, such as by the monitoring systems layer 3306, the platform-operated marketplace 3327 and/or one or more external marketplaces 3390 for submission data 4418, event data 3324, or other data that may satisfy or indicate satisfaction of one or more conditions 4410 or trigger application of one or more rules of the smart contract 3431, such as to trigger a reward 4412.

At a component 4516, upon satisfaction of conditions, smart contracts may be settled, executed, or the like, resulting in updates or other operations on the blockchain 3422, such as by transferring consideration (such as via a payments system) and transferring access to submissions 4418. Thus, via the above-referenced steps, an operator of the platform-operated marketplace 3327 may discover, configure, deploy, and have executed a set of smart contracts that crowdsource innovations that are cryptographically secured and transferred on a blockchain from innovators to parties seeking innovation. In embodiments, the adaptive intelligent systems layer 3304 may be used to monitor the steps of the algorithm described above, and one or more artificial intelligence systems may be used to automate, such as by robotic process automation, the entire process or one or more sub-steps or sub-algorithms. This may occur as described above, such as by having an artificial intelligence system learn on a training set of data resulting from observations, such as monitoring software interactions of human users as they undertake the above-referenced steps. Once trained, the adaptive intelligent systems layer 3304 may thus enable the platform 3300 to provide a fully automated platform for crowdsourcing of innovation.

Figure 46:
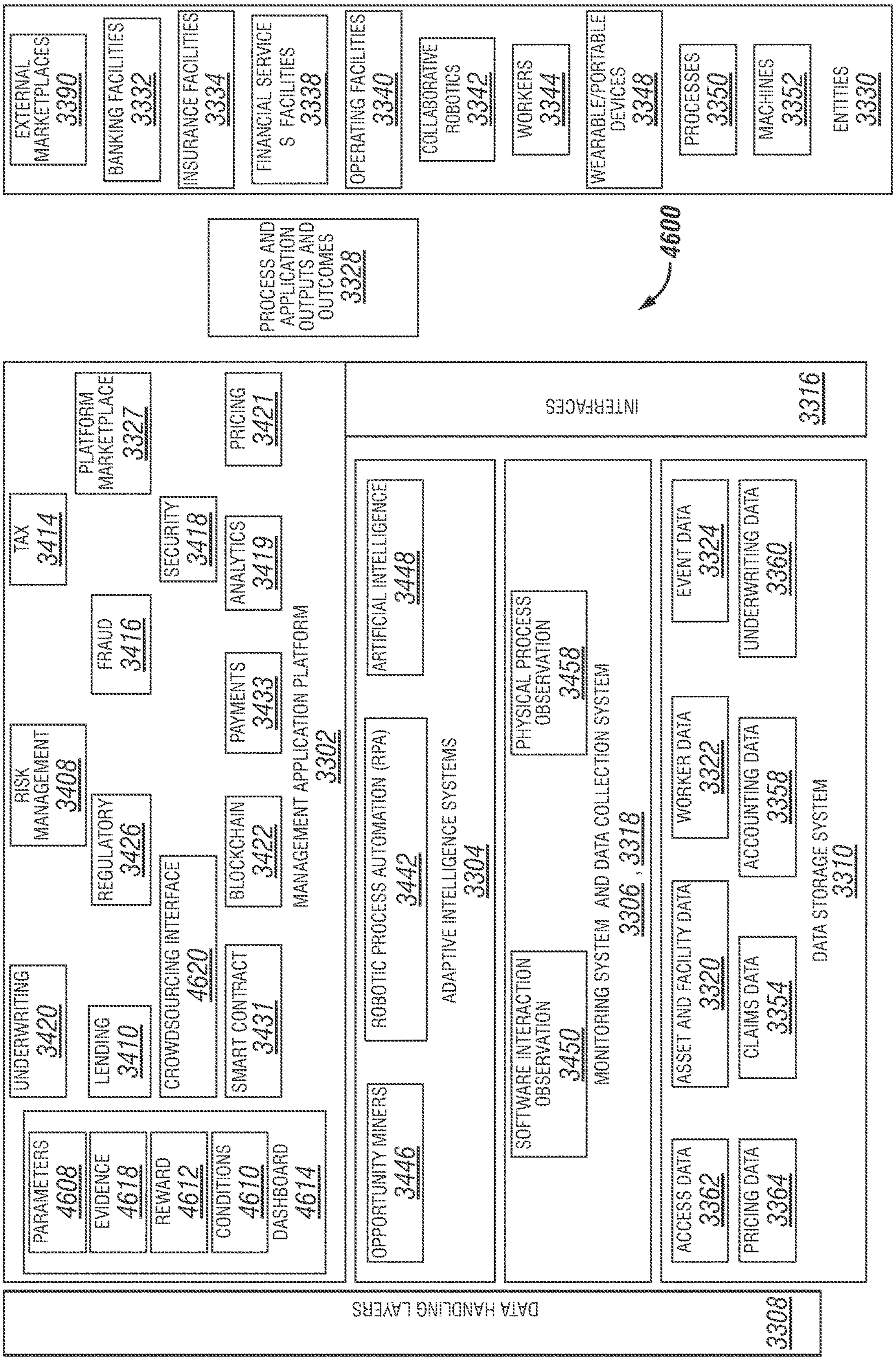
FIG. 46 depicts a blockchain and smart contract platform for crowdsourcing for evidence.

Referring to FIG. 46, in embodiments, a platform is provided herein, with systems, methods, processes, services, components and other elements for enabling a blockchain and smart contract platform 4600 for crowdsourcing for evidence. As with other embodiments described above in connection with sourcing innovation, product demand, or the like, a blockchain 3422, such as optionally embodying a distributed ledger, may be configured with a set of smart contracts 3431 to administer a reward 4612 for the submission of evidence 4618, such as evidence of infringement, evidence of prior art, evidence of publication, evidence of use, evidence of commercial sales, evidence of fraud, evidence of false statements, evidence of trespassing, evidence of negligence, evidence of misrepresentation, evidence of slander or libel, evidence of undertaking illegal activities, evidence of undertaking risky activities, evidence of omissions, evidence of breach of contract, evidence of torts, evidence of criminal conduct, evidence of regulatory violations, evidence of non-compliance with policies or procedures, evidence of the location of an individual (optionally including known or preferred locations), evidence of a social network or other relationship of an individual, evidence of a business connection of an individual or business, evidence of an asset of an individual or business, evidence of defects, evidence of harm, evidence of counterfeiting, evidence of identity (such as DNA, fingerprinting, video, photography or the like), evidence of damage, evidence of confusion (such as in cases of trademark infringement) or other evidence that may be relevant to a civil or criminal legal proceeding, a contract enforcement or negotiation, an arbitration or mediation, a hearing, or other proceeding. In embodiments, a blockchain 3422, such as optionally distributed in a distributed ledger, may be used to configure a request for evidence 4618 (which may be a formal legal request, such as a subpoena, or an alternative form of request, such as in a fact-gathering situation), along with terms and conditions 4610 related to the evidence, such as a reward 4612 for submission of the evidence 4618, a set of terms and conditions 4610 related to the use of the evidence 4618 (such as whether it may only be released under subpoena, whether the submitting party has a right to anonymity, the nature of proceedings in which the evidence can be used, the permitted conditions for use of the evidence 4618, and the like), and various parameters 4608, such as timing parameters, the nature of the evidence required (such as scientifically validated evidence like DNA or fingerprints, video footage, photographs, witness testimony, or the like), and other parameters 4608.

The platform 4600 may include a crowdsourcing interface 4620, which may be included in or provided in coordination with a website, application, dashboard, communications system (such as for sending emails, texts, voice messages, advertisements, broadcast messages, or other messages), by which a message may be presented in the interface 4620 or sent to relevant individuals (whether targeted, such as in the case of a subpoena, or broadcast, such as to individuals in a given location, company, organization, or the like) with an appropriate link to the smart contract 3431 and associated blockchain 3422, such that a reply message submitting evidence 4618, with relevant attachments, links, or other information, can be automatically associated (such as via an API or data integration system) with the blockchain 3422, such that the blockchain 3422, and any optionally associated distributed ledger, maintains a secure, definitive record of evidence 4618 submitted in response to the request. Where a reward 4612 is offered, the blockchain 3422 and/or smart contract 3431 may be used to record time of submission, the nature of the submission, and the party submitting, such that at such time as a submission satisfies the conditions for a reward 4612 (such as, for example, upon apprehension of a subject in a criminal case or invalidation of a patent upon use of submitted prior art, among many other examples), the blockchain 3422 and any distributed ledger stored thereby can be used to identify the submitter and, by execution of the smart contract 3431, convey the reward 4612 (which may take any of the forms of consideration noted throughout this disclosure). In embodiments, the blockchain 3422 and any associated ledger may include identifying information for submissions of evidence 4618 without containing actual evidence 4618, such that information may be maintained secret (such as being encrypted or being stored separately with only identifying information), subject to satisfying or verifying conditions for access (such as a legal subpoena, a warrant, or other identification or verification of a person who has legitimate access rights, such as by an identity or security application 3418). Rewards 4612 may be provided based on outcomes of cases or situations to which evidence 4618 relates, based on a set of rules (which may be automatically applied in some cases, such as using a smart contract 3431 in concert with an automation system, a rule processing system, an artificial intelligence system 3448 or other expert system, which in embodiments may comprise one that is trained on a training data set created with human experts). For example, a machine vision system may be used to evaluate evidence of counterfeiting based on images of items, and parties submitting evidence of counterfeiting may be rewarded, such as via tokens or other consideration, via distribution of rewards 4612 through the smart contract 3431, blockchain 3422 and any distributed ledger. Thus, the platform 4600 may be used for a wide variety of fact-gathering and evidence-gathering purposes, to facilitate compliance, to deter improper behavior, to reduce uncertainty, to reduce asymmetries of information, or the like.

Figure 47:
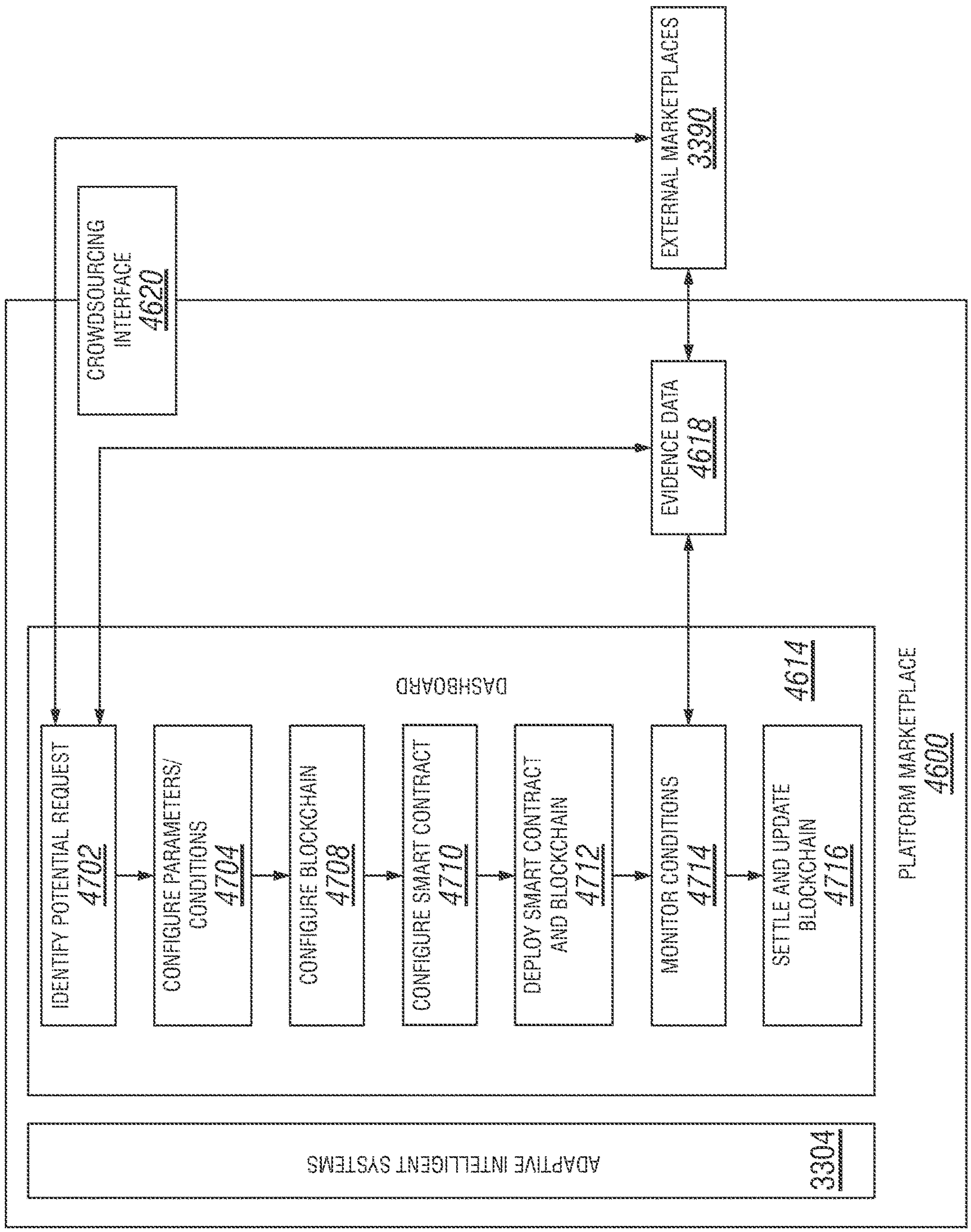
FIG. 47 depicts an algorithm and a dashboard of a blockchain and smart contract platform for crowdsourcing for evidence.

Referring to FIG. 47, a platform-operated marketplace crowdsourcing evidence 4600 may be configured, such as in a crowdsourcing interface 4620 or other user interface for an operator of the platform-operated marketplace 4600, using the various enabling capabilities of the data handling platform 3300 described throughout this disclosure. The operator may use the user interface 4620 or crowdsourcing dashboard 4614 to undertake a series of steps to perform or undertake an algorithm to create a crowdsourcing request for evidence 4618 as described in connection with FIG. 46. In embodiments, one or more interactions with the components to create a reward 4612 within the dashboard 4614 may include, at a component 4702, identifying potential rewards 4612, such as what evidence 4618 is likely to be of value in a given situation (such as may be indicated through various communication channels by stakeholders or representatives of an entity, such as an individual or enterprise, such as attorneys, agents, investigators, parties, auditors, detectives, underwriters, inspectors, and many others).

The dashboard 4614 may be configured with a crowdsourcing interface 4620, such as with elements (including application programming elements, data integration elements, messaging elements, and the like) that allow a crowdsourcing request to be managed in the platform marketplace 4600 and/or in one or more external marketplaces 3390. In the dashboard 4614, at a component 4704, the user may configure one or more parameters 4608 or conditions 4610, such as comprising or describing the conditions (of the type described herein) for the crowdsourcing request, such as by defining a set of conditions 4610 that trigger the reward 4612 and determine allocation of the reward 4612 to a set of submitters of evidence 4618. The user interface of the dashboard 4614, which may include or be associated with the crowdsourcing interface 4620, may include a set of drop down menus, tables, forms, or the like with default, templated, recommended, or pre-configured conditions, parameters 4608, conditions 4610 and the like, such as ones that are appropriate for various types of crowdsourcing requests. Once the conditions and other parameters of the request are configured, at a component 4708, a smart contract 3431 and blockchain 3422 may be configured to maintain, such as via a ledger, the data required to provision, allocate, and exchange data related to the request and to submissions of evidence 4618. The smart contract 3431 and blockchain 3422 may be configured to identity information, transaction information (such as for exchanges of information), technical information, other evidence data 4618 of the type described in connection with FIG. 46, including any data, testimony, photo or video content or other information that may be relevant to a submission of evidence 4618, or the conditions 4610 for a reward 4612. At a component 4710, a smart contract 3431 may be configured to embody the conditions 4610 that were configured at the component 4704 and to operate on the blockchain 3422 that was created at the component 4708, as well as to operate on other data, such as data indicating facts, conditions, events, or the like in the platform-operated marketplace 4600 and/or an external marketplace 3390 or other information site or resource, such as ones related to submission of evidence data 4618, such as sites indicating outcomes of legal cases or portions of cases, sites reporting on investigations, and the like. The smart contract 3431 may be responsive to apply one or more rules configured at component 4710, to execute one or more conditional operations or the like upon data, such as evidence data 4618 and data indicating satisfaction of parameters 4608 or conditions 4610, as well as identity data, transactional data, timing data, and other data. Once configuration of one or more blockchains 3422 and one or more smart contracts 3431 is complete, at a component 4712, the blockchain 3422 and smart contract 3431 may be deployed in the platform-operated marketplace 4600, external marketplace 3390 or other site or environment, such as for interaction by one or more submitters or other users, who may, such as in a crowdsourcing interface 4620, such as a website, application, or the like, enter into the smart contract 3431, such as by submitting a submission of evidence 4618 and requesting the reward 4612, at which point the platform 4600, such as using the adaptive intelligent systems layer 3304 or other capabilities, may store relevant data, such as submitted evidence data 4618, identity data for the party or parties entering the smart contract 3431 on the blockchain 3422, or otherwise on the platform 4600. At a component 4714, once the smart contract 3431 is executed, the platform 4600 may monitor, such as by the monitoring systems layer 3306, the platform-operated marketplace 4600 and/or one or more external marketplaces 3390 or other sites for submitted evidence data 4618, event data 3324, or other data that may satisfy or indicate satisfaction of one or more conditions 4610 or trigger application of one or more rules of the smart contract 3431, such as to trigger a reward 4612.

At a component 4716, upon satisfaction of conditions 4610, smart contracts 3431 may be settled, executed, or the like, resulting in updates or other operations on the blockchain 3422, such as by transferring consideration (such as via a payment system) and transferring access to evidence 4618. Thus, via the above-referenced steps, an operator of the platform-operated marketplace 4600 may discover, configure, deploy, and have executed a set of smart contracts 3431 that crowdsource evidence and that are cryptographically secured and transferred on a blockchain 3422 from evidence gatherers to parties seeking evidence. In embodiments, the adaptive intelligent systems layer 3304 may be used to monitor the steps of the algorithm described above, and one or more artificial intelligence systems may be used to automate, such as by robotic process automation 3442, the entire process or one or more sub-steps or sub-algorithms. This may occur as described above, such as by having an artificial intelligence system 3448 learn on a training set of data resulting from observations, such as monitoring software interactions of human users as they undertake the above-referenced steps. Once trained, the adaptive intelligent systems layer 3304 may thus enable the platform 3300 to provide a fully automated platform for crowdsourcing of evidence.

In embodiments, evidence may relate to fact-gathering or data-gathering for a variety of applications and solutions that may be supported by a marketplace platform 3300, including the evidence crowdsourcing platform 4600, such as for underwriting 3420 (e.g., of insurance policies, loans, warranties, guarantees, and other items), including actuarial processes; risk management solutions 3408 (such as managing a wide variety of risks noted throughout this disclosure); tax solutions (such as relating to evidence supporting deductions and tax credits, among others); lending solutions 3410 (such as evidence of the ownership and or value of collateral, evidence of the veracity of representations, and the like); regulatory solutions 3426 (such as with respect to compliance with a wide range of regulations that may govern entities 3330 and processes, behaviors or activities of or by entities 3330); and fraud prevention solutions 3416 (such as to detect fraud, misrepresentation, improper behavior, libel, slander, and the like).

Evidence gathering may include evidence gathering with respect to entities 3330 and their identities, assertions, claims, actions, or behaviors, among many other factors and may be accomplished by crowdsourcing in the crowdsourcing platform 4600 or by data collection systems 3318 and monitoring systems 3306, optionally with automation via process automation 3442 and adaptive intelligence, such as using an artificial intelligence system 3448.

In embodiments, the evidence gathering platform, whether a crowdsourcing platform 4600 or a more general data collection platform 3300 that may or may not encompass crowdsourcing, is provided herein, with systems, methods, processes, services, components, and other elements for enabling a blockchain and smart contract platform for aggregating identity and behavior information for insurance underwriting 3420. In embodiments, a blockchain, with an optional distributed ledger, may be used to record a set of events, transactions, activities, identities, facts, and other information associated with an underwriting process 3420, such as identities of applicants for insurance, identities of parties that may be willing to offer insurance, information regarding risks that may be insured (of any type, such as property, life, travel, infringement, health, home, commercial liability, product liability, auto, fire, flood, casualty, retirement, unemployment and many others traditionally insured by insurance policies, in addition to a host of other types of risks that are not traditionally insured), information regarding coverage, exclusions, and the like, information regarding terms and conditions, such as pricing, deductible amounts, interest rates (such as for whole life insurance) and other information. The blockchain 3422 and an associated smart contract 3431 may, in coordination with or via a website, application, communications system, message system, marketplace, or the like, be used to offer insurance and to record information submitted by applicants, so that an insurance application has a secure, canonical record of submitted information, with access control capabilities that permit only authorized parties, roles and services to access submitted information (such as governed by policies, regulations, and terms and conditions of access). The blockchain 3422 may be used in underwriting 3420, such as by recording information (including evidence as noted in connection with evidence gathering above) that is relevant to pricing, underwriting, coverage, and the like, such as collected by underwriters, submitted by applicants, collected by artificial intelligence systems 3448, or submitted by others (such as in the case of crowdsourcing platform 4600). In embodiments, the blockchain 3422, smart contract 3431 and any distributed ledger may be used to facilitate offering and underwriting of microinsurance, such as for defined risks related to defined activities for defined time periods that are narrower than for typical insurance policies. For example, insurance related to adverse weather events may be obtained for the day of a wedding. The blockchain 3422 may facilitate allocation of risk and coordination of underwriting activities for a group of parties, such as where a group of parties agree to take some fraction of the risk, as recorded in the ledger. For example, the ledger may allow a party to take any fraction of the risk, thereby accumulating partial insurance unless and until a risk is fully covered as the rest of accumulation and aggregation of multiple parties agreeing, as recorded on the ledger, to insure an activity, a risk, or the like. The ledger may be used to allocate payments upon occurrence of the covered risk event. In embodiments, an artificial intelligence system 3448 may be used to collect and analyze underwriting data, such as one that is trained by human expert underwriters. In embodiments, an automated system 3442, such one using artificial intelligence 3448, such as one trained to recognized and validate events, can be used to determine that an event has happened (e.g., a roof has collapsed, a car has been damage, or the like), such as from videos, images, sensors, IoT devices, witness submissions (such as over social networks), or the like, such that an operation on the distributed ledger may be initiated to pay out the insured amount, including initiating appropriate debits and credits that reflect transfer of funds from the underwriting/insuring parties to the insured. Thus, a blockchain-based ledger may simplify and automate much of the insurance process by reliably validating identities, maintaining confidentiality of information as needed, automatically accumulating evidence needed for pricing and underwriting, automatically processing information indicating occurrence of insured events, and automatically settling and fulfilling contracts upon occurrence of validated events.

Lending Platform

Figure 48:
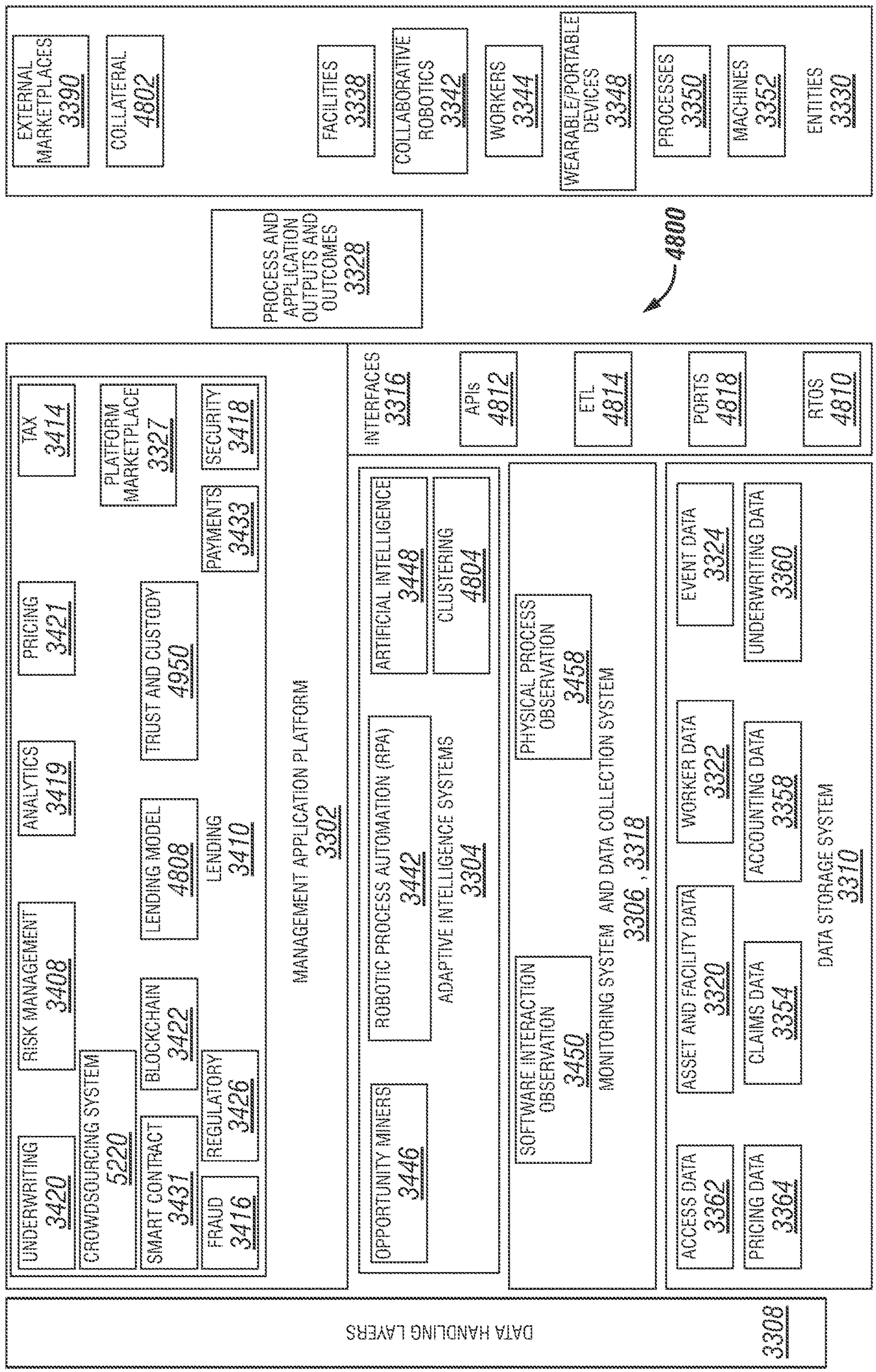
FIG. 48 depicts components and interactions of an embodiment of a lending platform having a set of data-integrated microservices including data collection and monitoring services for handling lending entities and transactions.

Referring to FIG. 48, an embodiment of a financial, transactional and marketplace enablement system 3300 is illustrated wherein a lending enablement system 4800 is enabled and wherein a platform-oriented marketplace 3327 may comprise a lending platform 3410. The lending enablement system 4800 may include a set of systems, applications, processes, modules, services, layers, devices, components, machines, products, sub-systems, interfaces, connections, and other elements (collectively referred in the alternative, except where context indicates otherwise, as the "platform," the "lending platform," the "system," and the like) working in coordination (such as by data integration and organization in a services oriented architecture) to enable intelligent management of a set of entities 3330 that may occur, operate, transact or the like within, or own, operate, support or enable, one or more applications, services, solutions, programs or the like of the lending platform 3410 or external marketplaces 3390 that involve lending transactions or lending-related entities, or that may otherwise be part of, integrated with, linked to, or operated on by the platform 3300 and system 4800. References to a set of services herein should be understood, except where context indicates otherwise, these and other various systems, applications, processes, modules, services, layers, devices, components, machines, products, sub-systems, interfaces, connections, and other types of elements. A set may include multiple members or a single member. As with other embodiments of the system 3300, the system 4800 may have various data handling layers with components, modules, systems, services, components, functions, and other elements described in connection with other embodiments described throughout this disclosure and the documents incorporated herein by reference. This may include various adaptive intelligent systems layer 3304, monitoring systems 3306, data collection systems 3318, and data storage systems 3310, as well as a set of application programming interfaces 3316 of, to, and/or among each of those systems and/or the various other elements of the platform 3300 and system 4800. In embodiments, the application programming interfaces 3316 may include application programming interfaces 4812; data integration technologies for extracting, transforming, cleansing, normalizing, deduplicating, loading and the like as data is moved among various services using various protocols and formats (collectively referred to as ETL systems 4814); and various ports, portals, connectors, gateways, wired connections, sockets, virtual private networks, containers, secure channels and other connections configured among elements on a one-to-one, one-to-many, or many-to-one basis, such as in unicast, broadcast and multi-cast transmission (collectively referred to as ports 4818). Application programming interfaces 3316 may include, be enabled by, integrate with, or interface with a real time operating system (RTOS) 4810, such as the FreeRTOS™ operating system, that has a deterministic execution pattern in which a user may define an execution pattern, such as based on assignment of a priority to each thread of execution. An instance of the RTOS 4810 may be embedded, such as on a microcontroller of an Internet of Things device, such as one used to monitor various entities 3330. The RTOS 4810 may provide real-time scheduling (such as scheduling of data transmissions to monitoring system layers 3306 and data collection systems 3318, scheduling of inter-task communication among various service elements, and other timing and synchronization elements). In embodiments, the application programming interfaces 3316 may use or include a set of libraries that enable secure connection between small, low-power edge devices, such as Internet of Things devices used to monitor entities 3330, and various cloud-deployed services of the platform 3300 and system 4800, as well as a set of edge devices and the systems that enable them, such as ones running local data processing and computing systems such as AWS IoT Greengrass™ and/or AWS Lambda™ functions, such as to allow local calculation, configuration of data communication, execution of machine learning models (such as for prediction or classification), synchronization of devices or device data, and communication among devices and services. This may include use of local device resources such as serial ports, GPUs, sensors, and cameras. In embodiments, data may be encrypted for secure end-to-end communication.

In the context of a lending enablement system 4800 and set of lending solutions 3410, entities 3330 may include any of the wide variety of assets, systems, devices, machines, facilities, individuals or other entities mentioned throughout this disclosure or in the documents incorporated herein by reference, such as, without limitation: machines 3352 and their components (e.g., machines that are the subject of a loan or collateral for a loan, such as various vehicles and equipment, as well as machines used to conduct lending transactions, such as automated teller machines, point of sale machines, vending machines, kiosks, smart-card-enabled machines, and many others, including ones used to enable microloans, payday loans and others); financial and transactional processes 3350 (such as lending processes, inspection processes, collateral tracking processes, valuation processes, credit checking processes, creditworthiness processes, syndication processes, interest rate-setting processes, software processes (including applications, programs, services, and others), production processes, collection processes, banking processes (e.g., lending processes, underwriting processes, investing processes, and many others), financial service processes, diagnostic processes, security processes, safety processes, assessment processes, payment processes, valuation processes, issuance processes, factoring processes, consolidation processes, syndication processes, collection processes, foreclosure processes, title transfer processes, title verification processes, collateral monitoring processes, and many others); wearable and portable devices 3348 (such as mobile phones, tablets, dedicated portable devices for financial applications, data collectors (including mobile data collectors), sensor-based devices, watches, glasses, hearables, head-worn devices, clothing-integrated devices, arm bands, bracelets, neck-worn devices, AR/VR devices, headphones, and many others); workers 3344 (such as banking workers, loan officers, financial service personnel, managers, inspectors, brokers (e.g., mortgage brokers), attorneys, underwriters, regulators, assessors, appraisers, process supervisors, security personnel, safety personnel and many others); robotic systems 3342 (e.g., physical robots, collaborative robots (e.g., “cobots”), software bots and others); and facilities (such as inventory warehousing facilities, factories, homes, buildings, storage facilities (such as for loan-related collateral, property that is the subject of a loan, inventory (such as related to loans on inventory), personal property, components, packaging materials, goods, products, machinery, equipment, and other items), banking facilities (such as for commercial banking, investing, consumer banking, lending and many other banking activities) and others). In embodiments, entities 3330 may include external marketplaces 3390, such as financial, commodities, e-commerce, advertising, and other marketplaces 3390 (including current and future markets), such as ones within which transactions occur in various goods and services, such that monitoring of the marketplaces 3390 and entities 3330 within them may provide lending-relevant information, such as with respect to the price or value of items, the liquidity of items, the characteristics of items, the rate of depreciation of items, or the like. For example, for various entities that may comprise collateral 4802 or assets for asset-backed lending, a monitoring system layer(s) 3306 may monitor not only the collateral 4802 or assets, such as by cameras, sensors, or other monitoring systems 3306, but may also collect data, such as via data collection systems 3318 of various types, with respect to the value, price, or other condition of the collateral 4802 or assets, such as by determining market conditions for collateral 4802 or assets that are in similar condition, of similar age, having similar specifications, having similar location, or the like. In embodiments, an adaptive intelligent systems layer 3304 may include a clustering system 4804, such as one that groups or clusters entities 3330, including collateral 4802, parties, assets, or the like by similarity of attributes, such as a k-means clustering system, self-organizing map system, or other system as described herein and in the documents incorporated herein by reference. The clustering system may organize collections of collateral, collections of assets, collections of parties, and collections of loans, for example, such that they may be monitored and analyzed based on common attributes, such as to enable performance of a subset of transactions to be used to predict performance of others, which in turn may be used for underwriting 3420, pricing 3421, fraud detection 3416, or other applications, including any of the services, solutions, or applications described in connection with FIG. 48 and FIG. 49 or elsewhere throughout this disclosure or the documents incorporated herein by reference. In embodiments, condition information about collateral 4802 or assets is continuously monitored by a monitoring system 3306, such as a set of sensors on the collateral 4802 or assets, a set of sensors or cameras in the environment of the collateral 4802 or assets, or the like, and market information is collected in real time by a data collection system 3318, such that the condition and market information may be time-aligned and used as a basis for real time estimation of the value of the collateral or assets and forward prediction of the future value of the collateral or assets. Present and predicted value for the collateral 4802 or assets may be based on a model, which may be accessed and used, such as in a smart contract 3431, to enable automated, or machine-assisted lending on the collateral or assets, such as the underwriting or offering of a microloan on the collateral 4802 or assets. Aggregation of data for a set of collateral 4802 or set of assets, such as a collection or fleet of collateral 4802 or fleet of assets owned by an entity 3330 may allow real time portfolio valuation and larger scale lending, including via smart contracts 3431 that automatically adjust interest rates and other terms and conditions based on the individual or aggregated value of collateral 4802 or assets based on real time condition monitoring and real-time market data collection and integration. Transactions, party information, transfers of title, changes in terms and conditions, and other information may be stored in a blockchain 3422, including loan transactions and information (such as condition information for collateral 4802 or assets and marketplace data) about the collateral 4802 or assets. The smart contract 3431 may be configured to require a party to confirm condition information and/or market value information, such as by representations and warranties that are supported or verified by the monitoring system layers 3306 (which may flag fraud in a fraud detection system 3416). A lending model 4808 may be used to value collateral 4802 or assets, to determine eligibility for lending based on the condition and/or value of collateral 4802 or assets, to set pricing (e.g., interest rates), to adjust terms and conditions, and the like. The lending model 4808 may be created by a set of experts, such as using analytics solutions 3419 on past lending transactions. The lending model 4808 may be populated by data from monitoring system layers 3306 and data collection systems 3318, may pull data from storage systems 3310, and the like. The lending model 4808 may be used to configure parameters of a smart contract 3431, such that smart contract terms and conditions automatically adjust based on adjustments in the lending model 4808. The lending model 4808 may be configured to be improved by artificial intelligence 3448, such as by training it on a set of outcomes, such as outcomes from lending transactions (e.g., payment outcomes, default outcomes, performance outcomes, and the like), outcomes on collateral 4802 or assets (such as prices or value patterns of collateral or assets over time), outcomes on entities (such as defaults, foreclosures, performance results, on time payments, late payments, bankruptcies, and the like), and others. Training may be used to adjust and improve model parameters and performance, including for classification of collateral or assets (such as automatic classification of type and/or condition, such as using vision-based classification from camera-based monitoring systems 3306), prediction of value of collateral 4802 or assets, prediction of defaults, prediction of performance, and the like. In embodiments, configuration or handling of smart contracts 3431 for lending on collateral 4802 or assets may be learned and automated in a robotic process automation (RPA) system 3442, such as by training the RPA system 3442 to create smart contracts 3431, configure parameters of smart contracts 3431, confirm title to collateral 4802 or assets, set terms and conditions of smart contracts 3431, initiate security interests on collateral 4802 for smart contracts, monitor status or performance of smart contracts 3431, terminate or initiate termination for default of smart contracts 3431, close smart contracts 3431, foreclose on collateral 4802 or assets, transfer title, or the like, such as by using monitoring system layers 3306 to monitor expert entities 3330, such as human managers, as they undertake a training set of similar tasks and actions in the creation, configuration, title confirmation, initiation of security interests, monitoring, termination, closing, foreclosing, and the like for a training set of smart contracts 3431. Once an RPA system 3442 is trained, it may efficiently create the ability to provide lending at scale across a wide range of entities and assets that may serve as collateral 4802, that may provide guarantees or security, or the like, thereby making loans more readily available for a wider range of situations, entities 3330, and collateral 4802. The RPA system 3442 may itself be improved by artificial intelligence 3448, such as by continuously adjusting model parameters, weights, configurations, or the like based on outcomes, such as loan performance outcomes, collateral valuation outcomes, default outcomes, closing rate outcomes, interest rate outcomes, yield outcomes, return-on-investment outcomes, or others. Smart contracts 3431 may include or be used for direct lending, syndicated lending, and secondary lending contracts, individual loans or aggregated tranches of loans, and the like.

In embodiments, the lending solution 3410 of the financial and transactional management application platform layer 3302 may, in various optional embodiments, include, integrate with, or interact with (such as within other embodiments of the platform 3300) a set of applications 3312, such as ones by which a lender, a borrower, a guarantor, an operator or owner of a transactional or financial entity, or other user, may manage, monitor, control, analyze, or otherwise interact with one or more elements related to a loan, such as an entity 3330 that is a party to a loan, the subject of a loan, the collateral for a loan, or otherwise relevant to the loan. This may include any of the elements noted above in connection with FIG. 33. The set of applications 3312 may include a lending application 3410 (such as, without limitation, for personal lending, commercial lending, collateralized lending, microlending, peer-to-peer lending, insurance-related lending, asset-backed lending, secured debt lending, corporate debt lending, student loans, subsidized loans, mortgage lending, municipal lending, sovereign debt, automotive lending, pay day loans, loans against receivables, factoring transactions, loans against guaranteed or assured payments (such as tax refunds, annuities, and the like), and many others). The lending solution 3410 may include, integrate with, or link with one or more of any of a wide range of other types of applications that may be relevant to lending, such as an investment application 3402 (such as, without limitation, for investment in tranches of loans, corporate debt, bonds, syndicated loans, municipal debt, sovereign debt, or other types of debt-related securities); an asset management application 3404 (such as, without limitation, for managing assets that may be the subject of a loan, the collateral for a loan, assets that back a loan, the collateral for a loan guarantee, or evidence of creditworthiness, assets related to a bond, investment assets, real property, fixtures, personal property, real estate, equipment, intellectual property, vehicles, and other assets); a risk management application 3408 (such as, without limitation, for managing risk or liability with respect to subject of a loan, a party to a loan, or an activity relevant to the performance of a loan, such as a product, an asset, a person, a home, a vehicle, an item of equipment, a component, an information technology system, a security system, a security event, a cybersecurity system, an item of property, a health condition, mortality, fire, flood, weather, disability, business interruption, injury, damage to property, damage to a business, breach of a contract, and others); a marketing application 3412 (such as, without limitation, an application for marketing a loan or a tranche of loans, a customer relationship management application for lending, a search engine optimization application for attracting relevant parties, a sales management application, an advertising network application, a behavioral tracking application, a marketing analytics application, a location-based product or service targeting application, a collaborative filtering application, a recommendation engine for loan-related product or service, and others); a trading application 3428 (such as, without limitation, an application for trading a loan, a tranche of loans, a portion of a loan, a loan-related interest, or the like, such as a buying application, a selling application, a bidding application, an auction application, a reverse auction application, a bid/ask matching application, or others); a tax application 3414 (such as, without limitation, for managing, calculating, reporting, optimizing, or otherwise handling data, events, workflows, or other factors relating to a tax-related impact of a loan); a fraud prevention application 3416 (such as, without limitation, one or more of an identity verification application, a biometric identity validation application, a transactional pattern-based fraud detection application, a location-based fraud detection application, a user behavior-based fraud detection application, a network address-based fraud detection application, a black list application, a white list application, a content inspection-based fraud detection application, or other fraud detection application; a security application, solution or service 3418 (referred to herein as a security application, such as, without limitation, any of the fraud prevention applications 3416 noted above, as well as a physical security system (such as for an access control system (such as using biometric access controls, fingerprinting, retinal scanning, passwords, and other access controls), a safe, a vault, a cage, a safe room, or the like), a monitoring system (such as using cameras, motion sensors, infrared sensors and other sensors), a cyber security system (such as for virus detection and remediation, intrusion detection and remediation, spam detection and remediation, phishing detection and remediation, social engineering detection and remediation, cyberattack detection and remediation, packet inspection, traffic inspection, DNS attack remediation and detection, and others) or other security application); an underwriting application 3420 (such as, without limitation, for underwriting any loan, guarantee, or other loan-related transaction or obligation, including any application for detecting, characterizing or predicting the likelihood and/or scope of a risk, including underwriting based on any of the data sources, events or entities noted throughout this disclosure or the documents incorporated herein by reference); a blockchain application 3422 (such as, without limitation, a distributed ledger capturing a series of transactions, such as debits or credits, purchases or sales, exchanges of in kind consideration, smart contract events, or the like, a cryptocurrency application, or other blockchain-based application); a real estate application 3424 (such as, without limitation, a real estate brokerage application, a real estate valuation application, a real estate mortgage or lending application, a real estate assessment application, or other); a regulatory application 3426 (such as, without limitation, an application for regulating the terms and conditions of a loan, such as the permitted parties, the permitted collateral, the permitted terms for repayment, the permitted interest rates, the required disclosures, the required underwriting process, conditions for syndication, and many others); a platform-operated marketplace application, solution or service 3327 (referred to as a marketplace application, such as, without limitation, a loan syndication marketplace, a blockchain-based marketplace, a cryptocurrency marketplace, a token-based marketplace, a marketplace for items used as collateral, or other marketplace); a warranty or guarantee application 3417 (such as, without limitation, an application for a warranty or guarantee with respect to an item that is the subject of a loan, collateral for a loan, or the like, such as a product, a service, an offering, a solution, a physical product, software, a level of service, quality of service, a financial instrument, a debt, an item of collateral, performance of a service, or other item); an analytics solution 3419 (such as, without limitation, an analytic application with respect to any of the data types, applications, events, workflows, or entities mentioned throughout this disclosure or the documents incorporated by reference herein, such as a big data application, a user behavior application, a prediction application, a classification application, a dashboard, a pattern recognition application, an econometric application, a financial yield application, a return on investment application, a scenario planning application, a decision support application, and many others); a pricing application 3421 (such as, without limitation, for pricing of interest rates and other terms and conditions for a loan). Thus, the financial and transactional management application platform layer 3302 may host and enable interaction among a wide range of disparate applications 3312 (such terms including the above-referenced and other financial or transactional applications, services, solutions, and the like), such that by virtue of shared microservices, shared data infrastructure, and shared intelligence, any pair or larger combination or permutation of such services may be improved relative to an isolated application of the same type.

In embodiments, the data collection systems 3318 and the monitoring system layers 3306 may monitor one or more events related to a loan, debt, bond, factoring agreement, or other lending transaction, such as events related to requesting a loan, offering a loan, accepting a loan, providing underwriting information for a loan, providing a credit report, deferring a required payment, setting an interest rate for a loan, deferring a payment requirement, identifying collateral or assets for a loan, validating title for collateral or security for a loan, recording a change in title of property, assessing the value of collateral or security for a loan, inspecting property that is involved in a loan, a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, and modifying terms and conditions for a loan.

Microservices Lending Platform with Data Collection Services, Blockchain and Smart Contracts In embodiments, provided herein is a platform, consisting of various services, components, modules, programs, systems, devices, algorithms, and other elements, for lending. An example platform or system for lending includes a set of microservices having a set of application programming interfaces that facilitate connection among the microservices and to the microservices by programs that are external to the platform, wherein the microservices include (a) a multi-modal set of data collection services that collect information about and monitor entities related to a lending transaction; (b) a set of blockchain services for maintaining a secure historical ledger of events related to a loan, the blockchain services having access control features that govern access by a set of parties involved in a loan; (c) a set of application programming interfaces, data integration services, data processing workflows and user interfaces for handling loan-related events and loan-related activities; and (d) a set of smart contract services for specifying terms and conditions of smart contracts that govern at least one of loan terms and conditions, loan-related events and loan-related activities.

Certain further aspects of an example system are described following, any one or more of which may be present in certain embodiments. An example system includes where the entities relevant to lending include a set of entities among lenders, borrowers, guarantors, equipment, goods, systems, fixtures, buildings, storage facilities, and items of collateral.

An example system includes where collateral items are monitored and the collateral items are selected from among a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system includes where the multi-modal set of data collection services include services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

An example system includes where the events related to a loan are selected from requesting a loan, offering a loan, accepting a loan, providing underwriting information for a loan, providing a credit report, deferring a required payment, setting an interest rate for a loan, deferring a payment requirement, identifying collateral for a loan, validating title for collateral or security for a loan, recording a change in title of property, assessing the value of collateral or security for a loan, inspecting property that is involved in a loan, a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, and modifying terms and conditions for a loan.

An example system includes where the set of terms and conditions for the loan that are specified and managed by the set of smart contract services is selected from among a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

An example system includes where a set of parties to the loan is selected from among a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, and an accountant.

An example system includes where loan-related activities include activities selected from the set of finding parties interested in participating in a loan transaction, an application for a loan, underwriting a loan, forming a legal contract for a loan, monitoring performance of a loan, making payments on a loan, restructuring or amending a loan, settling a loan, monitoring collateral for a loan, forming a syndicate for a loan, foreclosing on a loan, and closing a loan transaction.

An example system includes where the loan is of at least one type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the set of smart contract services configures at least one smart contract to automatically undertake a loan-related action based on information collected by the multi-modal set of data collection services.

An example system includes where the loan-related action is selected from among offering a loan, accepting a loan, underwriting a loan, setting an interest rate for a loan, deferring a payment requirement, modifying an interest rate for a loan, validating title for collateral, recording a change in title, assessing the value of collateral, initiating inspection of collateral, calling a loan, closing a loan, setting terms and conditions for a loan, providing notices required to be provided to a borrower, foreclosing on property subject to a loan, and modifying terms and conditions for a loan.

An example system includes where the platform or system may further include an automated agent that processes events relevant to at least one of the value, the condition, and the ownership of items of collateral and undertakes an action related to a loan to which the collateral is subject.

Figure 49:
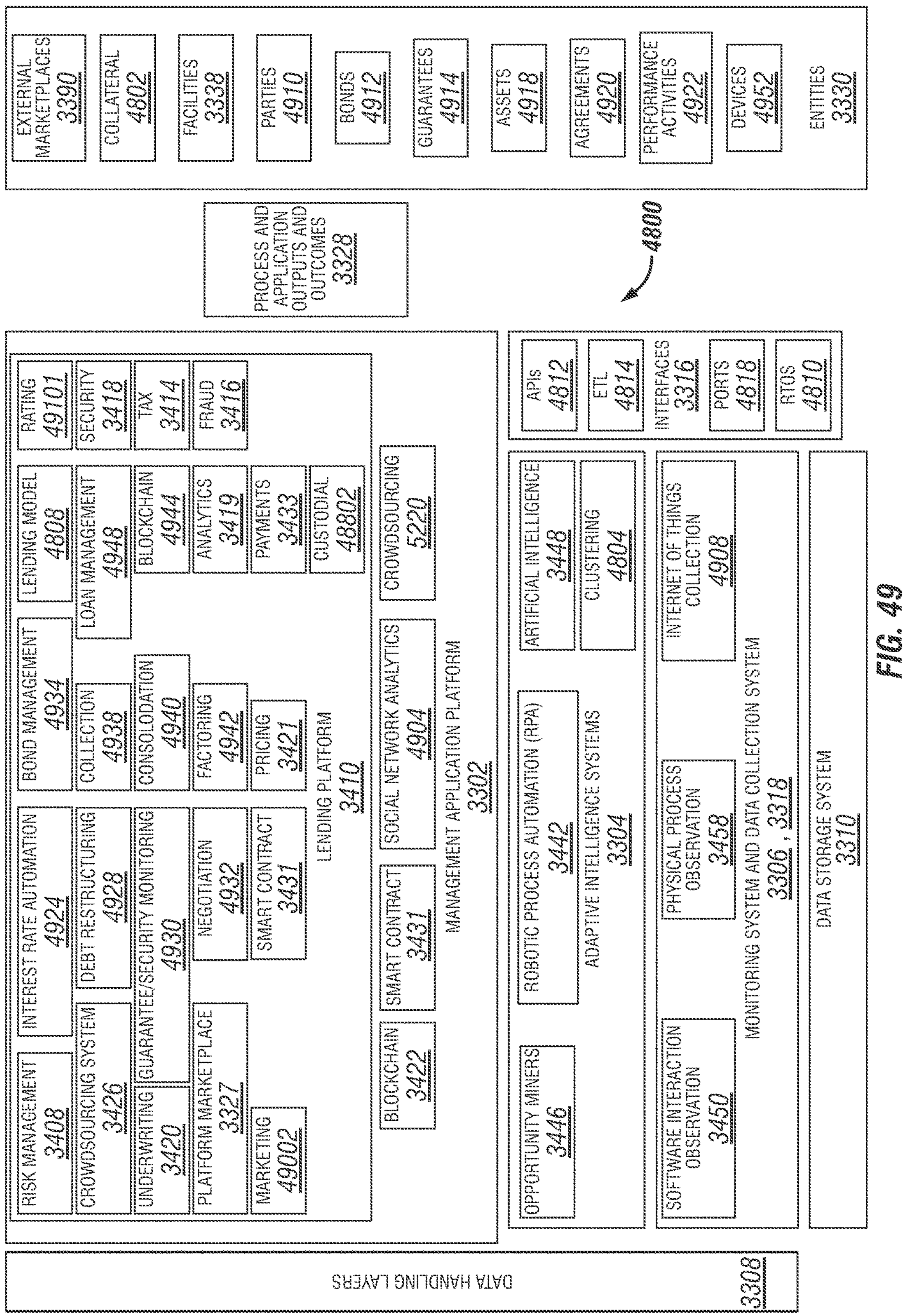
FIG. 49 depicts components and interactions of an embodiment of a lending platform in which a set of lending solutions are supported by a data-integrated set of data collection and monitoring services, adaptive intelligent systems, and data storage systems.

Referring to FIG. 49, additional applications, solutions, programs, systems, services and the like that may be present in a lending solution 3410 are depicted, which may be interchangeably included in the financial and transactional management application platform layer 3302 with other elements noted in connection with FIG. 48 and elsewhere throughout this disclosure and the documents incorporated herein by reference. Also depicted are additional entities 3330, which should be understood to be interchangeable with the other entities 3330 described in connection with various embodiments described herein. In addition to elements already noted above, the lending solution 3410 may include a set of applications, solutions, programs, systems, services and the like that include one or more of a social network analytics solution 4904 that may find and analyze information about various entities 3330 as depicted in one or more social networks (such as, without limitation, information about parties, behavior of parties, conditions of assets, events relating to parties or assets, conditions of facilities, location of collateral 4802 or assets, and the like), such as by allowing a user to configure queries that may be initiated and managed across a set of social network sites using data collection systems 3318 and monitoring systems 3306; a loan management solution 4948 (such as for managing or responding to one or more events related to a loan, (such events including, among others, requests for a loan, offering a loan, accepting a loan, providing underwriting information for a loan, providing a credit report, deferring a required payment, setting an interest rate for a loan, deferring a payment requirement, identifying collateral for a loan, validating title for collateral or security for a loan, recording a change in title of property, assessing the value of collateral or security for a loan, inspecting property that is involved in a loan, a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, and modifying terms and conditions for a loan) for setting terms and conditions for a loan (such as a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default), or managing loan-related activities (such as, without limitation, finding parties interested in participating in a loan transaction, handling an application for a loan, underwriting a loan, forming a legal contract for a loan, monitoring performance of a loan, making payments on a loan, restructuring or amending a loan, settling a loan, monitoring collateral for a loan, forming a syndicate for a loan, foreclosing on a loan, collecting on a loan, consolidating a set of loans, analyzing performance of a loan, handling a default of a loan, transferring title of assets or collateral, and closing a loan transaction); a rating solution 6801 (such as for rating an entity 3330 (such as a party 4910, collateral 4802, asset 4918 or the like), such as involving rating of creditworthiness, financial health, physical condition, status, value, presence or absence of defects, quality, or other attribute); a regulatory and/or compliance solution 3426 (such as for enabling specification, application and/or monitoring of one or more policies, rules, regulations, procedures, protocols, processes, or the like, such as ones that relate to terms and conditions of loan transactions, steps required in forming lending transactions, steps required in performing lending transactions, steps required with respect to security or collateral, steps required for underwriting, steps required for setting prices, interest rates, or the like, steps required to provide required legal disclosures and notices (e.g., presenting annualized percentage rates) and others); a custodial solution or set of custodial services 6502 (such as for taking custody of a set of assets 4918, collateral 4802, or the like (including cryptocurrencies, currency, securities, stocks, bonds, agreements evidencing ownership interests, and many other items), such as on behalf of a party 4910, client, or other entity 3330 that needs assistance in maintaining security of the items, or in order to provide security, backing, or a guarantee for an obligation, such as one involved in a lending transaction); a marketing solution 6702 (such as for enabling a lender to market availability of a loan to a set of prospective borrowers, to target a set of borrowers who are appropriate for a type of transaction, to configure marketing or promotional messages (including placement and timing of the message), to configure advertisement and promotional channels for lending transactions, to configure promotional or loyalty program parameters, and many others); a brokering solution 4944 (such as for brokering a set of loan transactions among a set of parties, such as a mortgage loan), which may allow a user to configure a set of preferences, profiles, parameters, or the like to find a set of prospective counterparties to a lending transaction; a bond management solution 4934 such as for managing, reporting on, syndicating, consolidating, or otherwise handling a set of bonds (such as municipal bonds, corporate bonds, performance bonds, and others); a guarantee monitoring solution 4930, such as for monitoring, classifying, predicting, or otherwise handling the reliability, quality, status, health condition, financial condition, physical condition or other information about a guarantee, a guarantor, a set of collateral supporting a guarantee, a set of assets backing a guarantee, or the like; a negotiation solution 4932, such as for assisting, monitoring, reporting on, facilitating and/or automating negotiation of a set of terms and conditions for a lending transaction (such as, without limitation, a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclosure condition, a default condition, and a consequence of default), which may include a set of user interfaces for configuration of parameters, profiles, preferences, or the like for negotiation, such as ones that use or are informed by the lending model 4808 and ones that use, are informed by, or that are automated by or with the assistance of a set of artificial intelligence services and systems 3448, by robotic process automation 3442, or other adaptive intelligent systems layer 3304; a collection solution 4938 for collecting on a loan, which may optionally use, be informed by, or be automated by or with the assistance of a set of artificial intelligence services and systems 3448, by robotic process automation 3442, or other adaptive intelligent systems layers 3304, such as based on monitoring the status or condition of various entities 3330 with the monitoring system layers 3306 and data collection systems 3318 in order to trigger collection, such as when one or more covenants has not been met, when collateral is in poor condition, when financial health of a party is below a threshold, or the like; a consolidation solution 4940 for consolidating a set of loans, such as using a lending model 4808 that is configured for modeling a consolidated set of loans and such as using or being automated by one or more adaptive intelligent systems layers 3304; a factoring solution 4942, such as for monitoring, managing, automating or otherwise handling a set of factoring transactions, such as using a lending model 4808 that is configured for modeling factoring transactions and such as using or being automated by one or more adaptive intelligent systems layer 3304; a debt restructuring solution 4928, such as for restructuring a set of loans or debt, such as using a lending model 4808 that is configured for modeling alternative scenarios for restructuring a set of loans or debt and such as using or being automated by one or more adaptive intelligent systems layers 3304; and/or an interest rate setting solution 4924, such as for setting or configuring a set of rules or a model for a set of interest rates for a set of lending transactions or for automating interest rate setting based on information collected by data collection systems 3318 or monitoring system layers 3306 (such as information about conditions, status, health, location, geolocation, storage condition, or other relevant information about any of the entities 3330), which may set interest rates or facilitate setting of interest rates for a set of loans, such as using a lending model 4808 that is configured for modeling interest rate scenarios for a set of loans and such as using or being automated by one or more of the adaptive intelligent systems layers 3304. As with the solutions referenced in connection with FIG. 48, the various solutions may share the adaptive intelligent systems layers 3304, the monitoring systems 3306, the data collection systems 3318 and the storage systems 3310, such as by being integrated into the platform 4800 in a microservices architecture having various appropriate data integration services, APIs, and interfaces.

As with the entities 3330 described in connection with FIG. 49, entities 3330 may further include a range of entities that are involved with loans, debt transactions, bonds, factoring agreements, and other lending transactions, such as: collateral 4802 and assets 4918 that are used to secure, guarantee, or back a payment obligation (such as vehicles, ships, planes, buildings, homes, real estate, undeveloped land, farms, crops, facilities (such as municipal facilities, factories, warehouses, storage facilities, treatment facilities, plants, and others), systems, a set of inventory, commodities, securities, currencies, tokens of value, tickets, cryptocurrencies, consumables, edibles, beverages, precious metals, jewelry, gemstones, intellectual property, intellectual property rights, contractual rights, legal rights, antiques, fixtures, equipment, furniture, tools, machinery and personal property); a set of parties 4910 (such as one or more of a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, an agent, an attorney, a valuation professional, a government official, and/or an accountant); a set of agreements 4920 (such as loans, bonds 4912, lending agreements, corporate debt agreements, subsidized loan agreements, factoring agreements, consolidation agreements, syndication agreements, guarantee agreements, underwriting agreements, and others, which may include a set of terms and conditions that may be searched, collected, monitored, modified or otherwise handled by the platform 4800, such as interest rates, payment schedules, payment amounts, principal amounts, representations and warranties, indemnities, covenants, and other terms and conditions); a set of guarantees 4914 (such as provided by personal guarantors, corporate guarantors, government guarantors, municipal guarantors and others to secure or back a payment obligation or other obligation of a lending agreement 4920); a set of performance activities 4922 (such as making payments of principal and/or interest, maintaining required insurance, maintaining title, satisfying covenants, maintaining condition of collateral 4802 or assets 4918, conducting business as required by an agreement; and many others); and devices 4952 (such as Internet of Things devices that may be disposed on or in goods, equipment or other items, such as ones that are collateral 4802 or assets 4918 used to back a payment obligation or to satisfy a covenant or other requirement, or that may be disposed on or in packaging for goods, as well as ones disposed in facilities or other environments where entities 3330 may be located). In embodiments, an agreement 4920 may be for a bond, a factoring agreement, a syndication agreement, a consolidation agreement, a settlement agreement, or a loan, such as one or more of an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

As noted elsewhere herein and in documents incorporated by reference, artificial intelligence (such as any of the techniques or systems described throughout this disclosure) in connection with various transactional and marketplace entities 3330 and related processes and applications may be used to facilitate, among other things: (a) the optimization, automation and/or control of various functions, workflows, applications, features, resource utilization and other factors, (b) recognition or diagnosis of various states, entities, patterns, events, contexts, behaviors, or other elements; and/or (c) the forecasting of various states, events, contexts or other factors. As artificial intelligence improves, a large array of domain-specific and/or general artificial intelligence systems have become available and are likely to continue to proliferate. As developers seek solutions to domain-specific problems, such as ones relevant to entities 3330 and applications of the platform 100 described throughout this disclosure, they face challenges in selecting artificial intelligence models (such as what set of neural networks, machine learning systems, expert systems, or the like to select) and in discovering and selecting what inputs may enable effective and efficient use of artificial intelligence for a given problem. As noted above, opportunity mining modules 153 may assist with the discovery of opportunities for increased automation and intelligence; however, once opportunities are discovered, selection and configuration of an artificial intelligence solution still presents a significant challenge, one that is likely to continue to grow as artificial intelligence solutions proliferate.

One set of solutions to these challenges is an artificial intelligence store 157 that is configured to enable collection, organization, recommendation, and presentation of relevant sets of artificial intelligence systems based on one or more attributes of a domain and/or a domain-related problem. In embodiments, an artificial intelligence store 157 may include a set of interfaces to artificial intelligence systems, such as enabling the download of relevant artificial intelligence applications, establishment of links or other connections to artificial intelligence systems (such as links to cloud-deployed artificial intelligence systems via APIs, ports, connectors, or other interfaces) and the like. The artificial intelligence store 157 may include descriptive content with respect to each of a variety of artificial intelligence systems, such as metadata or other descriptive material indicating suitability of a system for solving particular types of problems (e.g., forecasting, NLP, image recognition, pattern recognition, motion detection, route optimization, or many others) and/or for operating on domain-specific inputs, data, or other entities. In embodiments, the artificial intelligence store 157 may be organized by category, such as domain, input types, processing types, output types, computational requirements and capabilities, cost, energy usage, and other factors. In embodiments, an interface to the artificial intelligence store 157 may take input from a developer and/or from the platform (such as from an opportunity mining module 153) that indicates one or more attributes of a problem that may be addressed through artificial intelligence and may provide a set of recommendations, such as via an artificial intelligence attribute search engine, for a subset of artificial intelligence solutions that may represent favorable candidates based on the developer's domain-specific problem.

In embodiments, criteria for determining the recommendation may include level of anticipated human oversight. This may include, among others, understanding the level and types of decisions delegated to human workers (such as a decision to purchase a security, taking a market decision, taking a license on Intellectual property, financial limits on actions and ordering (e.g. is the RPA able to order or commit to transactions below a certain amount, above which a human is involved), the level and type of anticipated human supervision of robotic process automation operations, anticipated extent of human supervision and/or governance of model training and training data set selection. A further consideration may be the level and type of anticipated human involvement in the curation of model versions (such as identifying historical break points where input data should be discarded); and others.

In embodiments, criteria for determining the recommendation may include security considerations such as adversarial training and complex environments such as network attacks, viruses, and the like. Additional security considerations may include the security and management of historic training datasets, including audit trails. Security considerations may include the model traceability and accuracy, how will the model or controlling parameters be updated, who will have authority to update the model, how will the updates be documented, how will results be correlated with model updates, how will version control be implemented and documented, and the like. Another security consideration will be documentation of the results of the AI for audit trails, including financial results and performance results.

In embodiments, criteria for determining the recommendation may include the availability of different AI types, models, algorithms, or systems (including heuristic/model-based AI, neural networks, and others). Availability may be limited by the computational environment that the user intends to use such as a given cloud platform, an on-premises IT system, or in a network (edge or other networks), and the like and whether a given type, model, or algorithm will run in the client's environment. In embodiments, computational factors and configurations may be criteria. For example, the available processor types for running the AI solution in the client's environment may be a factor including: chipsets, modules, device, cloud components, number, and architecture of processor types (e.g. multi-core processor availability, GPU availability, CPU availability, FPGA availability, custom ASIC availability, and the like), and the like. Additionally, computational factors, which may be expressed as minimum capability criteria, may include available processing capacity, both for solution training (for example utilizing a cloud computing resource) and solution operation deployment environment/capacity (e.g. IoT, in-vehicle, edge, mesh network, on-premises IT solution, stand along, or other deployment environments). Additional criteria may include software and interface criteria such as software environment such as operating systems (Linux, Mac, PC, and the like), languages and protocols used for APIs for access to input data sources for solution training as well as access to runtime data and data integration and output.

In embodiments, criteria may include various network factors such as available network type, available network bandwidth (input and output) for both AI solution and AI operation, network uptime, network redundance, variability of delivery times (sequencing of data may vary), as well as any of the other networks and network criteria described herein.

In embodiments, criteria may include performance or quality of service factors, either in absolute terms or relative to other AI and/or non-AI solutions (e.g. conventional models or rule-based solutions. Criteria may include speed/latency, time to train/configure and an AI solution, time for the AI solution to provide result in an operations situation, accuracy, reliability (e.g. ability to resolve to a result), consistency, absence of bias, outcome-based measures of quality such as return on investment (ROI), yield (e.g. output from an AI-governed operation), profitability, revenue and other economic measures, performance on safety measures, performance on security measures, energy consumption (e.g. overall consumption, timing-based consumption (e.g. ability to shift processing from peak to off-peak hours), ability to access renewable or low-carbon energy for model training and/or operation, management of cost of new model training initiatives (power costs, latency and validation of new models), and the like), and the like.

In embodiments, criteria may include the ability of the client to access a given type or model due to license requirements and limitations, client policies (described elsewhere herein), regulations (including in the client's jurisdiction, the jurisdiction of the data source (e.g. European data privacy laws and Safe Harbor), a jurisdiction governing a particular model, algorithm, or the like (e.g. export controls on technology), permissions (e.g. training data or operational data), and the like. Additionally, the recommendation may be influenced by the type of problem to be solved and whether there are specialized algorithms or methods that are optimized for the type of problem (e.g. quantum annealing based traveling salesperson solver or even classic heuristic methods that provide for reasonable baseline results).

In embodiments, criteria may include conformance or adherence to governance principles and policies. There may be policies regarding what input data sources may be used to train the AI solution. There may be policies regarding what input sources may be used during operation. For example, input data sources may be reviewed for potential bias, appropriate representation (either demographically or of the problem space), scope, and the like. There may be criteria regarding accreditation or approval of the solution by a regulatory body, certification organization, internal IT review, and the like. There may be policies and procedures that must be in place or implemented with respect to security (e.g. physical security of the system, cybersecurity, and the like), safety requirements (e.g. the safety of the user, the safety of output product, and the like), and the like.

In embodiments, the criteria for recommending an AI solution may include criteria regarding data availability such as the availability of data sources of adequate size, granularity, quality, reliability, location, time zones, accuracy, or the like for effective model training. Additional criteria regarding data availability may include the cost of data for: inputs for the model training, and/or input for model operation. Additional criteria may include the availability of data for operation of the AI solution, and the like. Criteria for AI selection may further include upstream data processing requirements, master data management considerations such as dimensional cleanup and data validation, and the like.

In embodiments, criteria for solution selection may include applicability of the model or solution to the given task or workflow of the "problem." Criteria may include benchmark performance of a given model relative to other models performing a known task type (e.g. a convolutional neural network for 2D object classification, a gated recurrent neural network for tasks that tend to produce exploding errors, or the like). In embodiments, selection of a solution may be based on the solution having a configuration that is similar or analogous to how a biological brain solves a similar task (e.g. where a sequence of neural network models are arranged to mimic a sequence or flow which may include serial elements, parallel elements, feedback loops, conditional logic junctions, graph-driven elements and other flow characteristics), such as a flow of modular or quasi-modular processes, such as ones involved in the brain of a human or other species, such as in visual or auditory processing, language recognition, speech, motion tracking, image recognition, facial recognition, motion coordination, tactile recognition, spatial orientation, and the like. Criteria may include application of class AI heuristic methods to function as guard rails or operations in less impactful areas.

In embodiments, criteria may include model deployment considerations such as requirements for model updates (e.g. frequency and requirement for retirement of models), management of historic models and maintaining historical decision engine, potential for distributed decision making capabilities, model curation rules (e.g. how long a model or input data are considered valid for training), and the like.

Search results or recommendations may, in embodiments, be based at least in part on collaborative filtering, such as by asking developers to indicate or select elements of favorable models, as well as by clustering, such as by using similarity matrices, k-means clustering, or other clustering techniques that associate similar developers, similar domain-specific problems, and/or similar artificial intelligence solutions. The artificial intelligence store 157 may include e-commerce features, such as ratings, reviews, links to relevant content, and mechanisms for provisioning, licensing, delivery, and payment (including allocation of payments to affiliates and or contributors), including ones that operate using smart contract and/or blockchain features to automate purchasing, licensing, payment tracking, settlement of transactions, or other features.

In embodiments, once a solution has been selected or recommended, the solution must be configured for the specific client and problem to be solved. Without limitation, configuration may include any of the factors mentioned in connection with the selection of a solution model above. Configuration of a set of neural network types (e.g., modules) in a flow (with options for serial elements, parallel elements, feedback loops, conditional logic junctions, graph-driven flows, and the like) that recognizes the relative strengths and weaknesses of each type of AI solution (based on any of the selection factors noted above) for the specific task involved in the flow is critical. In an illustrative and non-limiting example of a flow includes: a) identify something by visual classification (such as with a CNN), b) predict its future state (such as with a gated RNN), c) optimize the future state (using a feed forward neural network). Configuration options include selection of neural network type(s) (including hybrids of different neural networks and/or other model types in various flows as noted above); selection of input model type; setting of initial model weights; setting model size (e.g., number of layers in a deep neural network); selection of computational deployment environment; selection of input data sources for training; selection of input data sources for operation; selection of feedback function/outcome measures; selection of data integration language(s) for inputs and outputs; configuration of APIs for model training; configuration of APIs for model inputs; configuration of APIs for outputs; configuration of access controls (role-based, user-based, policy-based and others); configuration of security parameters; configuration of network protocols; configuration of storage parameters (type, location, duration); configuration of economic factors (e.g., pricing for access; cost-allocation; and others); and others. Additional configuration options may include configuration of data flows (e.g. flows from multiple security exchanges into centralized decision engines), configuration of high availability, fault tolerance environments (e.g. trading systems are required to fail down to operation state that meets services levels requirements), price based data acquisition strategies (e.g. detailed financial data may require additional spending), combination with heuristic methods, coordination of massively parallel decision making environments (e.g. distributed vision systems), and the like. Additional configurations may include making decision models if there is an area that requires further consideration (e.g. pushing a decision to the edge to monitor for a specific event).

In embodiments, another set of solutions, which may be deployed alone or in connection with other elements of the platform, including the artificial intelligence store, may include a set of functional imaging capabilities, which may comprise monitoring systems 3306 and data collection systems 3318 and, in some cases, physical process observation systems 3458 and/or software interaction observation systems 3450, such as for monitoring various transactional and marketplace entities 3330. Functional imaging systems may, in embodiments, provide considerable insight into the types of artificial intelligence that are likely to be most effective in solving particular types of problems most effectively. As noted elsewhere in this disclosure and in the documents incorporated by reference herein, computational and networking systems, as they grow in scale, complexity and interconnections, manifest problems of information overload, noise, network congestion, energy waste, and many others. As the Internet of Things grows to hundreds of billions of devices, and virtually countless potential interconnections, optimization becomes exceedingly difficult. One source for insight is the human brain, which faces similar challenges and has evolved, over millennia, reasonable solutions to a wide range of very difficult optimization problems. The human brain operates with a massive neural network organized into interconnected modular systems, each of which has a degree of adaptation to solve particular problems, from regulation of biological systems and maintenance of homeostasis to detection of a wide range of static and dynamic patterns, to recognition of threats and opportunities, among many others.

Setting up a robotic process automation (RPA) system includes selection of the best AI solution and configuration. There may be goals to train the RPA system, typically on human interactions with software and or hardware (e.g., tools) and to use the system in operation, both of which may be enhanced by understanding what is going on in the human brain as it solves a problem. In a single neural network solution (using one network to solve a problem in a single step, like single-step translation), the process would likely involve setting initial weights for inputs, selection of input data sources, selection of the type of network (e.g., convolutional or not, gated or not, deep or not, among others), the number of layers, and what inputs are provided to it (and outputs if there are complex outputs). The idea would be to pick inputs and weights that are the ones the human brain tends to use to solve the same problem. For hybrids of multiple AI modules/systems and/or AI combined with more conventional software systems (like control systems, analytic models, rule-based systems, conditional logic systems, and others), the value would likely be the above, plus configuring with awareness of time sequences of processing, such as reflecting patterns of brain activity as visual, auditory, tactile and other sensory information is processed to recognize situation, context, motion, objects, etc. and then other regions (that behave differently) to do things like solve a logic puzzle, calculate, follow an algorithm, proliferate possibilities, and many others. For these, a series of "lego blocks," each consisting of a different neural network or other AI type, can be sequenced, set in parallel, linked by conditional logic, etc. to achieve a solution that automates the process.

In embodiments, identification of a type of reasoning and/or a type of processing may be informed by undertaking brain imaging, such as functional MRI or other magnetic imaging, electroencephalogram (EEG), or other imaging, such as by identifying broad brain activity (e.g., wave bands of activity, such as delta, theta, alpha and gamma waves), by identifying a set of brain regions that are activated and/or inactive during the set interactions of the user that are being used for training of the intelligent agent (such as neocortex regions, such as Fp1 (involved in judgment and decision making), F7 (involved in imagination and mimicry), F3 (involved in analytic deduction), T3 (involved in speech), C3 (involved in storage of facts), T5 (involved in mediation and empathy), P3 (involved in tactical navigation), O1 (involved in visual engineering), Fp2 (involved in process management), F8 (involved in belief systems), F4 (involved in expert classification), T4 (involved in listening and intuition), C4 (involved in artistic creativity), T6 (involved in prediction), P4 (involved in strategic gaming), O2 (involved in abstraction), and/or combinations of the foregoing) or by other neuroscientific, psychological, or similar techniques that provide insight into how humans, upon which the intelligent agent is trained, are solving particular types of problems that are involved in workflows for which intelligent agents are deployed. In embodiments, an intelligent agent may be configured with a neural network type, or combination of types, that is selected to replicate or simulate a processing activity that is similar to the activity of the brain regions of a human expert that is performing a set of activities for which the intelligent agent is to be trained. As one example among many possible, a trader may be shown to use visual processing region O1 and strategic gaming region P4 of the neocortex when making successful trades, and a neural network may be configured with a convolutional neural network to provide effective replication of visual pattern recognition and a gated recurrent neural network to replicate strategic gaming. In embodiments, a library of neural network resources representing combinations of neural network types that mimic or simulate neocortex activities may be configured to allow selection and implementation of modules that replicate the combinations used by human experts to undertake various activities that are subjects of development of intelligent agents, such as involving robotic process automation. In embodiments, various neural network types from the library may be configured in series and/or in parallel configurations to represent processing flows, which may be arranged to mimic or replicate flows of processing in the brain, such as based on spatiotemporal imaging of the brain when involved in the activity that is the subject of automation. In embodiments, an intelligent software agent for agent development may be trained, such as using any of the training techniques described herein, to select a set of neural network resource types, to arrange the neural network resource types according to a processing flow, to configure input data sources for the set of neural network resources, and/or to automatically deploy the set of neural network types on available computational resources to initiate training of the configured set of neural network resources to perform a desired intelligent agent/automation workflow(s). In embodiments, the intelligent software agent used for agent development operates on an input data set of spatiotemporal imaging data of a human brain, such as an expert who is performing the workflows, and uses the spatiotemporal imaging data to automatically select and configure the selection and arrangement of the set of neural network types to initiate learning. Thus, a system for developing an intelligent agent may be configured for (optionally automatic) selection of neural network types and/or arrangements based on spatiotemporal neocortical activity patterns of human users involved in workflows for which the agent is trained. Once developed, the resulting intelligent agent/process automation system may be trained as described throughout this disclosure.

In embodiments, a system for developing an intelligent agent (including the aforementioned agent for development of intelligent agents) may use information from brain imaging of human users to infer (optionally automatically) what data sources should be selected as inputs for an intelligent agent. For example, for processes where neocortex region O1 is highly active (involving visual processing), visual inputs (such as available information from cameras, or visual representations of information like price patterns, among many others) may be selected as favorable data sources. Similarly, for processes involving region C3 (involving storage and retrieval of facts), data sources providing reliable factual information (such as blockchain-based distributed ledgers) may be selected. Thus, a system for developing an intelligent agent may be configured for (optionally automatic) selection of input data types and sources based on spatiotemporal neocortical activity patterns of human users involved in workflows for which the agent is trained.

Functional imaging, such as functional magnetic resonance imaging (fMRI), electroencephalogram (EEG), computed tomography (CT) and other brain imaging systems have improved to the point that patterns of brain activity can be recognized in real time and temporally associated with other information, such as behaviors, stimulus information, environmental condition data, gestures, eye movements, and other information, such that via functional imaging, either alone or in combination with other information collected by monitoring systems 3306, the platform may determine and classify what brain modules, operations, systems, and/or functions are employed during the undertaking of a set of tasks or activities, such as ones involving software interaction observation systems 3345, physical process observations 3340, or a combination thereof. This classification may assist in selection and/or configuration of a set of artificial intelligence solutions, such as from an artificial intelligence store, that includes a similar set of capabilities and/or functions to the set of modules and functions of the human brain when undertaking an activity, such as for the initial configuration of a robotic process automation (RPA) system 3442 that automates a task performed by an expert human.

In embodiments, a system may receive and/or monitor a set of inputs relating to a user, including image/video feeds, audio feeds, motion sensors, heartbeat monitor, other relevant biosensors, and the like. In embodiments, the system may also receive input relating to actions taken by the monitored user, such as input to a computing device or actions taken with respect to a physical environment in which the user is working. In embodiments, all the collected data is time stamped, so that, for example, a video feed may capture a series of images of a user while the user is performing a task and may concurrently capture the eye movements of the user (e.g. eye gaze tracking) to determine what the user is focusing on (e.g., what is the user looking at on a screen). During this time, the system may also track the user's heart rate or other biological sensor measurements to determine whether the user is engaged in a task that requires intense concentration or less focused concentration. The system may also track the actions taken and may further determine the amount of time taken between actions. An RPA solution can then distribute processing, such as to a heavier, more computationally intensive activity to an AI solution on a cloud platform (like a deep neural network with many layers) and placing less computationally intensive tasks, such as ones where a human makes very quick decisions on minimal input data, and/or on an edge or IoT device platform using a much more compact model, such as a TinyML™ model.

In embodiments, the system may determine the relative amount of time taken between actions, such that long periods of inaction may indicate that the user is involved in work that requires lots of thought, while short periods of inaction may indicate that the user is engaged in work that requires less thought and more action. The system may also monitor an audio feed and/or state of the computing device that a user is working on when the period of inaction occurs, which may be indicative of a user being distracted rather than focusing. Assuming that the user is actively working and not exhibiting distraction, then the system can generate a feature vector relating to the work being performed by the user that indicates the time-stamped data entries, which can be then fed into a machine-learned model. In embodiments, the machine-learned model may determine a brain region (or multiple brain regions) from the set of brain regions that were likely engaged during the work period. In embodiments, the machine-learned model may be trained using a training data set that includes labeled training vectors, where the label of each training vector indicates the brain region (or regions) that were being engaged by a subject when the training vector was generated. For example, each training vector may be labeled with one or more of: Fp1 (involved in judgment and decision making), F7 (involved in imagination and mimicry), F3 (involved in analytic deduction), T3 (involved in speech), C3 (involved in storage of facts), T5 (involved in mediation and empathy), P3 (involved in tactical navigation), O1 (involved in visual engineering), Fp2 (involved in process management), F8 (involved in belief systems), F4 (involved in expert classification), T4 (involved in listening and intuition), C4 (involved in artistic creativity), T6 (involved in prediction), P4 (involved in strategic gaming), O2 (involved in abstraction). In some embodiments, the training vector may indicate additional data, such as the type of task being performed, whether the subject was successful in completing the task, or other suitable information.

In embodiments, these machine-learned models may be trained on different types of work tasks, such as negotiating, drafting, data entry, responding to emails, analyzing data, reviewing documents, or the like. Furthermore, in some embodiments, such machine-learned models may be trained by one party but leveraged by other parties. In these embodiments, the machine-learned models (and/or the training data vectors) may be bought and sold via a marketplace. Such machine-learned models may be used in a broader RPA system, such that the output of the models may be used as a specific signal in an RPA learning process.

In general, using data from organizations for predicting positioning of the organization in market and adjusting processes within organization may be performed. In example embodiments, robotic imaging may be used to capture data of users (e.g., employees or workers) within the organization as they complete various tasks and processes while also correlating this information with completion of these tasks/processes. Various analytics may be obtained regarding success of completion of tasks (e.g., efficiency). Then, using data obtained from tracking/monitoring users, factors may be determined that indicate some users as being more successful than other users in completion of tasks (e.g., based on physical movements of users in doing tasks correctly, brain regions activated, physical strength of users, etc.). This may be based on scanning/monitoring of users as they complete tasks. In some example embodiments, the system may segregate data relating to users with successful task completions versus data relating to users with less successful completions. The system may analyze biological data of workers to determine what makes one worker more successful than other workers. In some example embodiments, this analysis may also be combined with data from machines to determine whether workers are using machines accurately/efficiently. This biological data from workers may also be used to determine whether more workers may be needed to improve efficiency. The system may use historical data and results from process competitions to look at what improvements should be made whether by training, selecting workers who are better are some tasks vs. others, etc. The resulting analytics on outcomes, and contributions to outcomes, may be used, for example, as a feedback function for weighting the value of particular capabilities for design of an AI solution that is intended to perform the same or similar tasks. In some example embodiments, various data and analysis as described above may be used with respect to determining whether improvements made based on the analysis also improve the market positioning of the organization.

An operator skilled in a task may develop strong memory connections to muscle functions—muscle memory—which translates into easily accomplished actions that, without this connection, would be difficult or at least require repeated attempts, slower operation, and the like. A system that can distinguish between actions accomplished using muscle memory and others may better identify which actions are worth following/repeating/learning.

Understanding the mechanisms of muscle memory—e.g., understanding the pathways from cognition (visual, auditory, etc.) inputs to develop muscle memory—may be a basis for understanding how to automate human actions. This may involve repetition type actions, association of one type of action with another type of action based on similarities, such as body positioning, expected result (dropping the hammer in the holster, etc.), and the like.

Additional value might be in understanding how two individuals can develop a form of muscle memory that allows them to "get into a rhythm," such as when exchanging physical items, what cues are they exchanging, visually recognizable actions (placement of hand/orientation), and how are those interpreted.

In embodiments, an imaging system may analyze brain images of multiple members of a team for a set of tasks or workflows that involve different types of expertise. Team performance can be tracked, and AI solutions may be configured to replicate the types of neural processing that are undertaken by different team members, such as motion tracking and coordination by one team member and executive decision making by another.

In embodiments, an imaging system may analyze brain images of multiple members of a mock trial or negotiation practice sessions for a set of verbal exchanges regarding an argument, point-count-point, and the like for negotiations, and the like. In addition to brain images, audio capture and bio-indicators of response to exchanges could also be harvested to increase the range of multi-dimensional data useful for learning how to automate human actions associated with successful negotiation and the like.

Given the level of abstraction humans use to trigger actions, e.g., recognizing an alarm tone or recognizing an action from a fellow worker, we can get less abstract in machine-machine communication, e.g., the input that triggered the alarm tone can trigger a direct machine-machine communication or, if the fellow worker is now a machine, they can indicate their positioning in their routine indicating they are ready to hand-off their work. This is similar to how less intelligent robots have been automated, even with simple macros where the "intelligence" is wrung out of the process to make it more robust, and there are strategies and methods for this that could be applied to these biologic-type inputs which are a level of abstraction beyond what is needed. This down-shift in complexity can, itself, be trained into the system as they recognize what myriad of "soft" triggers (e.g. image recognition) can be turned into "hard" triggers.

Using systems like Fp1 (involved in judgment and decision making), P3 (involved in tactical navigation), O1 (involved in visual engineering), Fp2 (involved in process management), F8 (involved in belief systems), and T4

(involved in listening and intuition), the training vectors may indicate, in some embodiments, a system of mixed audio and visual concepts. The system may use an expert system to monitor a set of inputs and reconfigure those inputs to monitor an asset including image feeds at various electromagnetic frequencies (such as visual light, thermal, UV, and the like), and audio feeds from those frequencies to determine use, sounds of use, and possible sounds of concerns. When examples include fixed assets (those that cannot move), ambient measurement of the environment may be measured along with signatures of use or non-use of the product such as lack of motion, thermal imprints, or lack thereof. The changing environment in the room and/or the contact with asset by user or other fixtures can cause reconfiguration of the sensors looking to appreciate the space. When fixed in a room, such systems may determine that ambient conditions, such as strong outside lighting (too rich of UV content) relative to more appropriate lighting, could be detrimental to the asset. Also included is sensing the motion of use. In more moveable assets, detection and parsing of benign motion rather than motion that may have a higher propensity to age or damage an asset can be recorded and characterized as an aggregated feed.

Risk management (Combination of F3 (analytic deduction) and Fp1 (judgment and decision making)), analytics, and decision making in the human brain are informed by experience and knowledge (which may be partial, limited, negative, positive, factual, emotional, etc.). AI can possibly recognize a situation using sensors, image recognition, proximity, text and conversation analysis, and the like and apply better risk management in decision making using stored fact-based outcomes for similar situations. This could be applied to enable consumers to make better purchasing and financial decisions. In other applications, it could be applied to emergency response, policing actions, etc.

In embodiments, an AI solution may be configured as a companion risk manager for a main operational AI solution, such as sharing common inputs and resources, but focused on identifying risks, externalities, and other factors that are not required for the core process automation, but may improve governance, safety, emergency response, and other aspects.

In embodiments, an AI solution may be configured as a companion risk manager for a main operational AI solution, such as sharing common inputs and resources, but focused on identifying risks, externalities, and other factors that are not required for the core process automation, but may improve governance, safety, emergency response, and other aspects.

Thus, the platform may include a system that takes input from a functional imaging system to configure, optionally automatically based on matching of attributes between one or more biological systems, such as brain systems, and one or more artificial intelligence systems, a set of artificial intelligence capabilities for a robotic process automation system. Selection and configuration may further comprise selection of inputs to robotic process automation and/or artificial intelligence that are configured at least in part based on functional imaging of the brain while workers undertake tasks, such as selection of visual inputs (such as images from cameras) where vision systems of the brain are highly activated, selection of acoustic inputs where auditory systems of the brain are highly activated, selection of chemical inputs (such as chemical sensors) where olfactory systems of the brain are highly activated, or the like. Thus, a biologically aware robotic process automation system may be improved by having initial configuration, or iterative improvement, be guided, either automatically or under developer control, by imaging-derived information collected as workers perform expert tasks that may benefit from automation.

Functional imaging may provide insight into which tasks involve serial processing versus parallel processing, providing insight into the type of AI solution that may be best suited to a similar task or tasks (e.g. is it best to receive language and visual data/inputs at once (in parallel) or sequentially). For example, the system may determine whether there is an order in which a user takes in data that might suggest an optimal ordering for performance. Analysis of functional images may enable identification of which computations tasks are most quickly processed through visual inputs versus textual inputs (language processing) and may enable improved matching of task to the best input/stimulus.

Functional imaging may enable determining efficiencies resulting from the pairing or multiple combinations of stimuli (e.g., is a task/command most efficiently communicated by providing multiple, diverse inputs at once, and/or is it best to omit certain stimuli from inputs/commands).

Functional imaging may enable ranking tasks or events to perform/solve based on the probabilistic improvement in the performance of a subsequent task (where task could be a computation or an actual action performed by a device based on a data/stimulus input).

Functional imaging may enable measuring negative impacts on performance/computation based on "noise," where noise may be unneeded data, irrelevant data, or overwhelming data sizes, similar to determining "negative stimuli" (in the human context this could be ambient noise in distinguishing a human voice within a cascade of auditory inputs, or ambient lighting in image recognition, or movement in counting objects in a region and so forth).

As one example among many possible, a marketplace host may be shown to use prediction region T6 and judgment and decision making region Fp1 when configuring a new marketplace, such as to predict favorable marketplace configuration parameters (such as to optimize marketplace efficiency profitability, and/or fairness) and to generate decisions related to marketplace parameters, and a neural network may be configured with a neural network to provide effective replication of prediction and a neural network to replicate decision making. The marketplace configuration parameters may include, but are not limited to, assets, asset types, description of assets, method for verification of ownership, method for delivery of traded goods, estimated size of marketplace, methods for advertising the marketplace, methods for controlling the marketplace, regulatory constraints, data sources, insider trading detection techniques, liquidity requirements, access requirements (such as whether to implement dealer-to-dealer trading, dealer-to-customer trading, or customer-to-customer trading), anonymity (such as determining whether counterparty identities are disclosed), continuity of order handling (e.g., continuous or periodic order handling), interaction (e.g., bilateral or multilateral), price discovery, pricing drivers (e.g., order-driven pricing or quote-driven pricing), price formation (e.g., centralized price formation or fragmented price formation), custodial requirements, types of orders allowed (such as limit orders, stop orders, market orders, and off-market orders), supported market types (such as dealer markets, auction markets, absolute auction markets, minimum bid auction markets, reverse auction markets, sealed bid auction markets, Dutch auction markets, multi-step auction markets (e.g., two-step, three-step, n-step, etc.), forward markets, futures markets, secondary markets, derivatives markets, contingent markets, markets for aggregates (e.g., mutual funds), and the like), trading rules (e.g., tick size, trading halts, open/close hours, escrow requirements, liquidity requirements, geographic rules, jurisdictional rules, rules on publicity, insider trading prohibitions, conflict of interest rules, timing rules (e.g., involving spot-market trading, futures trading and the like) and many others), asset listing requirements (e.g., financial reporting requirements, auditing requirements, minimum capital requirements), deposit minimums, trading minimums, verification rules, commission rules, fee rules, marketplace lifetime rules (e.g., short-term marketplace with timing constraints vs. long-term marketplace), data storage and use rules, and transparency (e.g., the amount and extent of information disseminated).

In embodiments, the configuration and/or orchestration of a new marketplace may involve the combination of existing marketplaces and/or the combination of products and/or services. For example, a marketplace for lodging (e.g., homestays for vacation rentals) and a marketplace for personal chef services may be combined to provide a marketplace for lodging with personal chef services (e.g., a personal chef at the vacation rental).

An RPA system may use AI systems related to biological brain functions F3 (involved in analytic deduction) and O1 (involved in visual engineering) in conjunction with one another to perform tasks related to visual calculus. The tasks related to visual calculus may include, for example, processing image sensor data via the O1 visual engineering system to determine what the RPA system "sees," and how to interpret, classify, identify, etc. what is "seen." Then, the F3 analytic deduction system may perform 1) deductions to determine what has led to the current state of what is "seen," and 2) prediction to determine a future state of what is "seen" based on the current state of visual data. The RPA system may use the T6 prediction function to assist in performing such predictions. The deductions may be useful in determining a cause of an issue, inefficiency, or problem in a system being analyzed. The predictions may be useful in determining solutions to problems and/or potential efficiency improvements. The AI system using F3, O1, and/or T6 may then also be used to choose a machine learned model suitable for performing the problem solving and/or efficiency improvement. For example, in a manufacturing environment, the RPA system and AI system may intake data from a plurality of visual IoT sensors, the visual data being from one or more sites on the manufacturing floor. The O1 visual engineering system may determine and/or classify what the visual data is seeing, such as one or more machines, products, assembly lines, etc. The F3 analytic deduction system may determine whether one or more of the machines, products, assembly lines, etc. are indicative of issues or inefficiencies. The T6 system may then make predictions and forward the predictions to a suitable machine learned model for determining solutions to problems and/or improvements to efficiencies.

Figure 50:
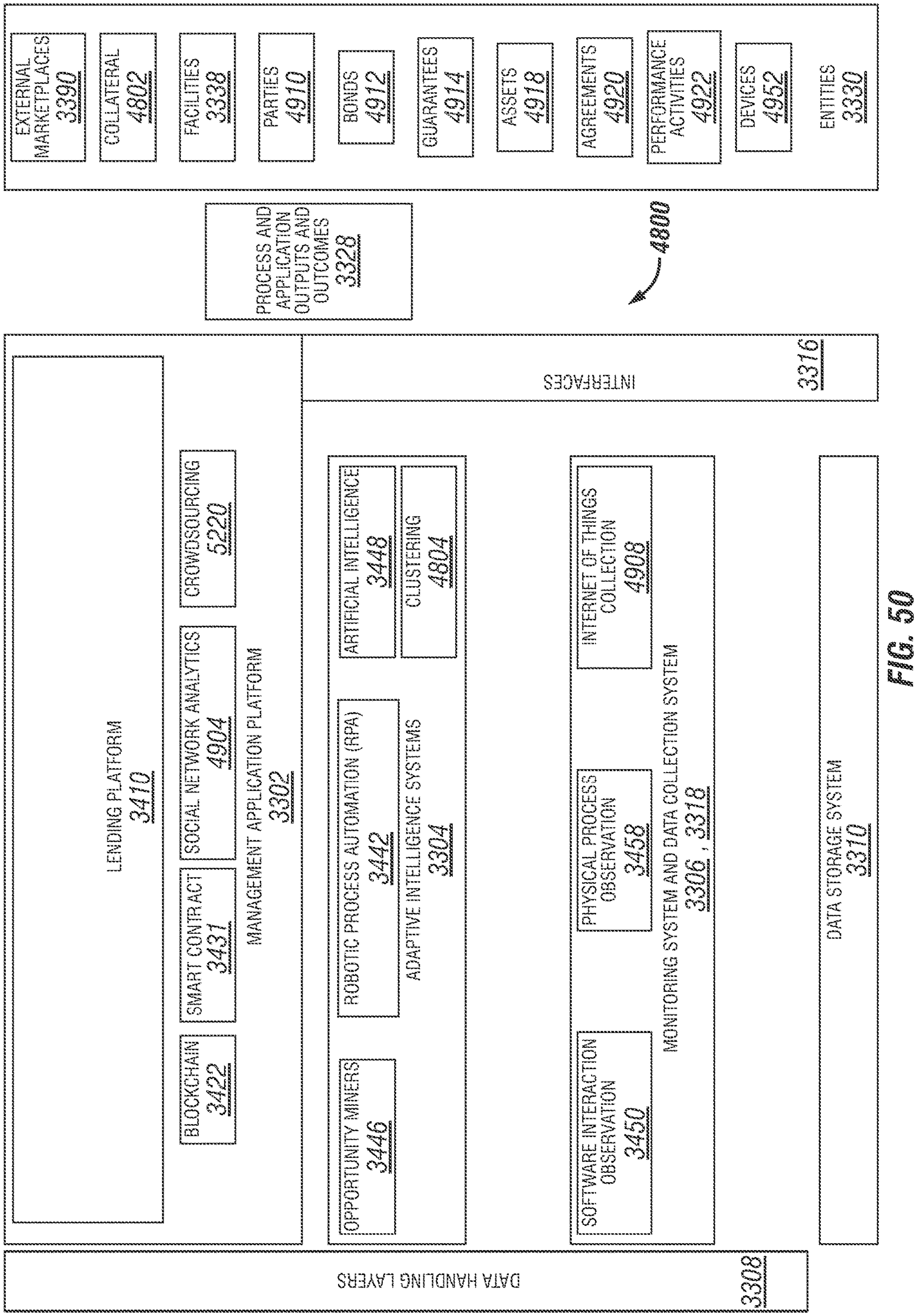
FIG. 50 depicts components and interactions of an embodiment of a lending platform having a set of data integrated blockchain services, smart contract services, social network analytic services, crowdsourcing services and Internet of Things data collection and monitoring services for collecting, monitoring, and processing information about entities involved in or related to a lending transaction.

Referring to FIG. 50, in embodiments, devices 4952 may be connected devices that connect (such as through any of the wide range of application programming interfaces 3316) to a set of Internet of Things (IoT) data collection services 4908, which may be part of or integrated with the data collection systems 3318 and monitoring system layers 3306 of the platform 4800. The application programming interfaces 3316 may include network interfaces, APIs, SDKs, ports, brokers, connectors, gateways, cellular network facilities, data integration interfaces, data migration systems, cloud computing interfaces (including ones that include computational capabilities, such as AWS IoT Greengrass™, Amazon™ Lambda™ and similar systems), and others. For example, the IoT data collection services 4908 may be configured to take data from a set of edge data collection devices in the Internet of Things, such as low-power sensor devices (e.g., for sensing movement of entities, for sensing, temperatures, pressures or other attributes about entities 3330 or their environments, or the like), cameras that capture still or video images of entities 3330, more fully enabled edge devices (such as Raspberry Pi™ or other computing devices, Unix™ devices, and devices running embedded systems, such as including microcontrollers, FPGAs, ASICs and the like), and many others. The IoT data collection services 4908 may, in embodiments, collect data about collateral 4802 or assets 4918, such as, for example, regarding the location, condition (health, physical, or otherwise), quality, security, possession, or the like. For example, an item of personal property, such as a gemstone, vehicle, item of artwork, or the like, may be monitored by a motion sensor and/or a camera having a known location (or having a location confirmed by GPS or other location system), to ensure that it remains in a safe, designated location. The camera can provide evidence that the item remains in undamaged condition and in the possession of a party 4910, such as to indicate that it remains appropriate and adequate collateral 4802 for a loan. In embodiments, this may include items of collateral for microloans, such as clothing, collectibles, and other items.

In embodiments, the lending platform 4800 has a set of data-integrated microservices including data collection systems 3318, monitoring services 3306, blockchain services 3422, and smart contract services 3431 for handling lending entities and transactions. The smart contract services 3431 may take data from the data collection systems 3318 and monitoring system layers 3306 (such as from IoT devices) and automatically execute a set of rules or conditions that embody the smart contract based on the collected data. For example, upon recognition that collateral 4802 for a loan has been damaged (such as evidenced by a camera or sensor), the smart contract services 3431 may automatically initiate a demand for payment of a loan, automatically initiate a foreclosure process, automatically initiate an action to claim substitute or backup collateral, automatically initiate an inspection process, automatically change a payment or interest rate term that is based on the collateral (such as setting an interest rate at a level for an unsecured loan, rather than a secured loan), or the like. Smart contract events may be recorded on a blockchain by the blockchain services 3422, such as in a distributed ledger. Automated monitoring of collateral 4802 and assets 4918 and handling of loans via smart contract services 3431 may facilitate lending to a much wider range of parties 4910 and undertaking of loans based on a much wider range of collateral 4802 and assets 4918 than for conventional loans, as lenders may have greater certainty as to the condition of collateral. Monitoring system layers 3306 and data collection systems 3318 may also monitor and collect data from external marketplaces 3390 or for marketplaces operated with the platform 4800 to maintain awareness of the value of collateral 4802 and assets 4918, such as to ensure that items remain of adequate value and liquidity to assure repayment of a loan. For example, public e-commerce auction sites like eBay™ can be monitored to confirm that personal property items are of a type and condition likely to be disposed of easily by a lender in a liquid public market, so that the lender is sure to receive payment if the borrower defaults. This may allow loans to be made and administered on a wide range of personal property that is normally difficult to use as collateral. In embodiments, an automated foreclosure process may be initiated by a smart contract, which may, upon occurrence of a condition of default that permits foreclosure (such as uncured failure to make payments) include a process for automatically initiating placement of an item of collateral on a public auction site (such as eBay™ or an auction site appropriate for a particular type of property), automatically securing collateral (such as by locking a connected device, such as a smart lock, smart container, or the like that contains or secures collateral), automatically configuring a set of instructions to a carrier, freight forwarder, or the like for shipping collateral, automatically configuring a set of instructions for a drone, a robot, or the like for transporting collateral, or the like. In embodiments, a system is provided for facilitating foreclosure on collateral. An example system for facilitating foreclosure on collateral may include a set of data collection and monitoring services for monitoring at least one condition of a lending agreement; and a set of smart contract services establishing terms and conditions of the lending agreement that include terms and conditions for foreclosure on at least one item that provides collateral securing a repayment obligation of the lending agreement, wherein upon detection of a default based on data collected by the data collection and monitoring services, the set of smart contract services automatically initiates a foreclosure process on the collateral. Certain further aspects of an example system are described following, any one or more of which may be present in certain embodiments. An example system includes where the set of smart contract services initiates a signal to at least one of a smart lock and a smart container to lock the collateral. An example system includes where the set of smart contract services configures and initiates a listing of the collateral on a public auction site. An example system includes where the set of smart contract services configures and delivers a set of transport instructions for the collateral. An example system includes where the set of smart contract services configures a set of instructions for a drone to transport the collateral. An example system includes where the set of smart contract services configures a set of instructions for a robot to transport the collateral. An example system includes where the set of smart contract services initiates a process for automatically substituting a set of substitute collateral. An example system includes where the set of smart contract services initiates a message to a borrower initiating a negotiation regarding the foreclosure. An example system includes where the negotiation is managed by a robotic process automation system that is trained on a training set of foreclosure negotiations. An example system includes where the negotiation relates to modification of at least one of the interest rate, the payment terms, and the collateral for the lending transaction.

Figure 51:
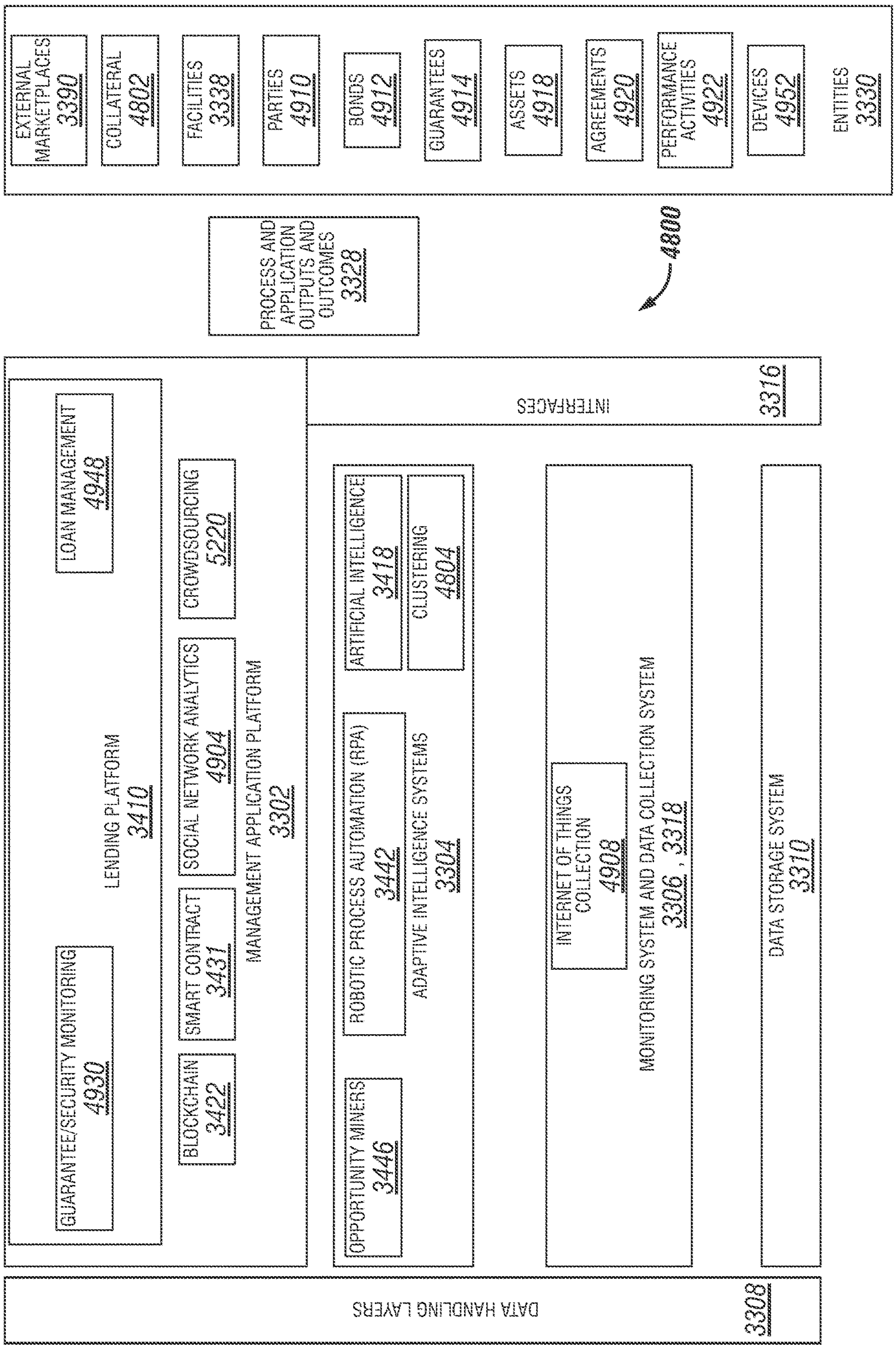
FIG. 51 depicts components and interactions of a lending platform having an Internet of Things and sensor platform for monitoring at least one of a set of assets, a set of collateral, and a guarantee for a loan, a bond, or a debt transaction.

Referring to FIG. 51, in embodiments, the lending platform 4800 is provided having an Internet of Things data collection platform 4908 (with various IoT and edge devices as described throughout this disclosure) for monitoring at least one of a set of assets 4918 and a set of collateral 4802 for a loan, a bond, or a debt transaction. The platform 4800 may include a guarantee and/or security monitoring solution 4930 for monitoring assets 4918 and/or collateral 4802 based on the data collected by the IoT data collection platform 4908, such as where the guarantee and/or security monitoring solution 4930 uses various adaptive intelligent systems layers 3304, such as ones that may use models (which may be adjusted, reinforced, trained, or the like, such as using artificial intelligence 3448) that determine the condition or value of items based on images, sensor data, location data, or other data of the type collected by the IoT data collection platform 4908. Monitoring may include monitoring of location of collateral 4802 or assets 4918, behavior of parties 4910, financial condition of parties 4910, or the like. The guarantee and/or security monitoring solution 4930 may include a set of interfaces by which a user may configure parameters for monitoring, such as rules or thresholds regarding conditions, behaviors, attributes, financial values, locations, or the like, in order to obtain alerts regarding collateral 4802 or assets 4918. For example, a user may set a rule that collateral must remain in a given jurisdiction, a threshold value of the collateral as a percentage of a loan balance, a minimum status condition (e.g., freedom from damage or defects), or the like. Configured parameters may be used to provide alerts to personnel responsible for monitoring loan compliance and/or used or embodied into one or more smart contracts that may take input from the interface of the guarantee and/or security monitoring solution 4930 to configure conditions for foreclosure, conditions for changing interest rates, conditions for accelerating payments, or the like. The platform 4800 may have a loan management solution 4948 that allows a loan manager to access information from the IoT data collection system 4908 and/or the guarantee and/or security monitoring solution 4930, such that a user may manage various actions with respect to a loan (of the many types described herein, such as setting interest rates, foreclosing, sending notices, and the like) based on the condition of collateral 4802 or assets 4918, based on events involving entities 3330, based on behaviors, based on loan-related actions (such as payments), and other factors. The loan management solution 4948 may include a set of interfaces, workflows, models (including adaptive intelligent systems layers 3304) that are configured for a particular type of loan (of the many types described herein) and that allow a user to configure parameters, set rules, set thresholds, design workflows, configure smart contract services, configure blockchain services, and the like in order to facilitate automated or assisted management of a loan, such as enabling automated handing of loan actions by a smart contract in response to collected data from the IoT data collection system 4908 or enabling generation of a set of recommended actions for a human user based on that data.

In embodiments, a lending platform is provided having a smart contract and distributed ledger platform for managing at least one of ownership of a set of collateral and a set of events related to a set of collateral. A set of smart contract services 3431 may, for example, transfer ownership of the collateral 4802 or other assets 4918 upon recognition of an event of failure to make payment or other default, occurrence of a foreclosure condition (such as failure to satisfy with a covenant or failure to comply with an obligation), or the like, where the ownership transfer and related events are recorded by the set of blockchain services 3422 in a distributed ledger, such as one that provides a secure record of title to the assets 4918 or collateral 4802. As an example, a covenant of a loan embodied in a smart contract may require that collateral 4802 have a value that exceeds a minimum fraction (or multiple) of the remaining balance of a loan. Based on data collected about the value of collateral (such as by monitoring one or more external marketplaces 3390 or marketplaces of the platform 4800), a smart contract may calculate whether the covenant is satisfied and record the outcome on a blockchain. If the covenant is not satisfied, such as if market factors indicate that the type of collateral has diminished, while the loan balance remains high, the smart contract may initiate a foreclosure, including recording an ownership transfer on a distributed ledger via the blockchain services 3422. A smart contract may also process events related to an entity 3330 such as a party 4910. For example, a covenant of a loan may require the party to maintain a level of debt below a threshold or ratio, to maintain a level of income, to maintain a level of profit, or the like. The monitoring system layers 3306 or data collection systems 3318 may provide data used by the smart contract services 3431 to determine covenant compliance and to enable automated action, including recording events like foreclosure and ownership transfers on a distributed ledger. In another example, a covenant may relate to a behavior of a party 4910 or a legal status of a party 4910, such as requiring the party to refrain from taking a particular action with respect to an item of property. For example, a covenant may require a party to comply with zoning regulations that prohibit certain usage of real property. IoT data collection systems 4908 may be used to monitor the party 4910, the property, or other items to confirm compliance with the covenant or to trigger alerts or automated actions in cases of non-compliance.

Figure 52:
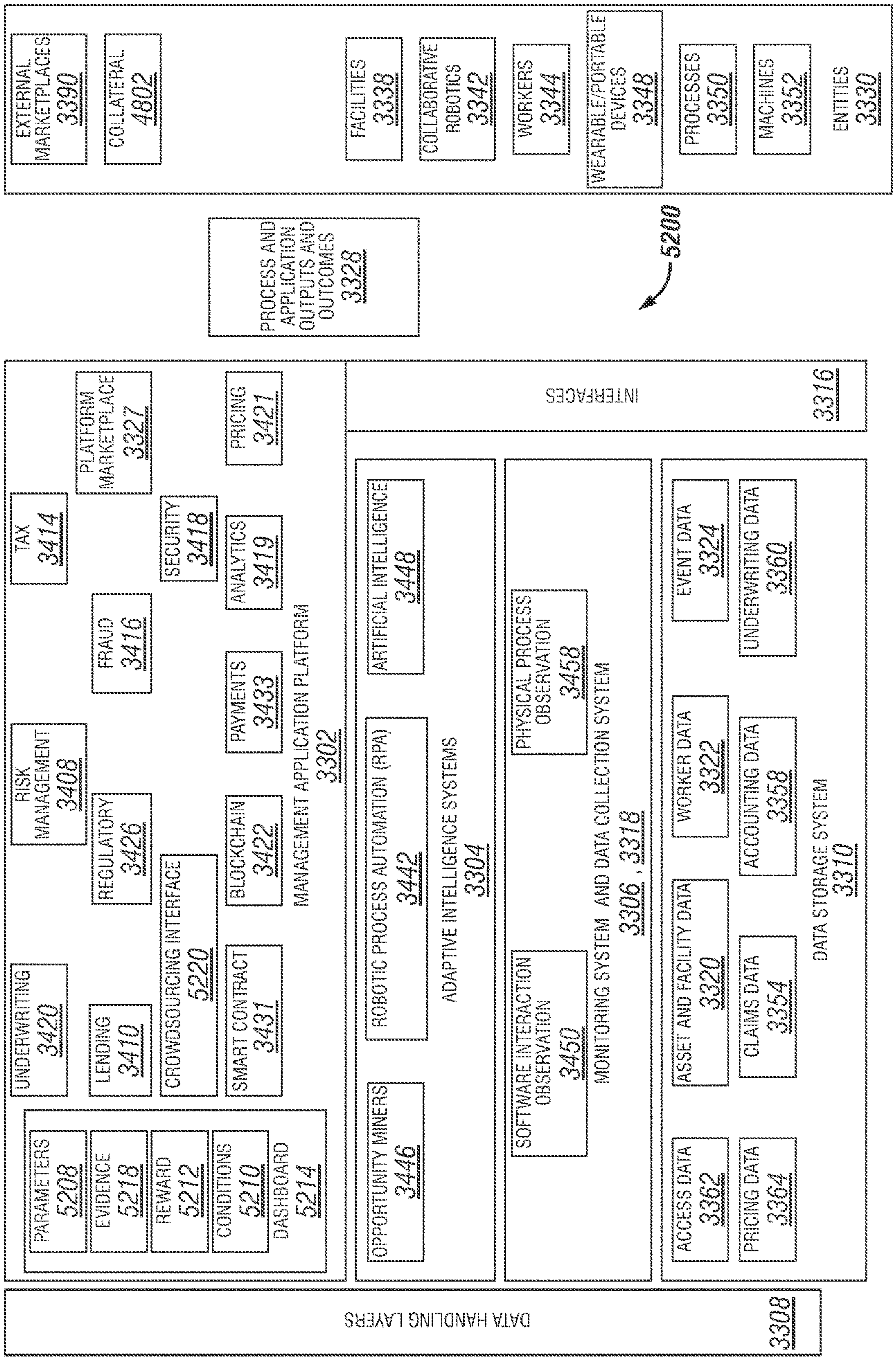
FIG. 52 depicts components and interactions of a lending platform having a crowdsourcing system for collecting information related to entities involved in a lending transaction.

Referring to FIG. 52, in embodiments, a lending platform is provided having a crowdsourcing system for obtaining information about at least one of a state of a set of collateral for a loan and a state of an entity relevant to a guarantee for a loan. Thus, in embodiments, a platform is provided herein, with systems, methods, processes, services, components, and other elements for enabling a blockchain and smart contract platform 5200 for crowdsourcing information relevant to lending. As with other embodiments described above in connection with sourcing innovation, product demand, or the like, a blockchain 3422, such as optionally embodying a distributed ledger, may be configured with a set of smart contracts 3431 to administer a reward 5212 for the submission of loan information 4418, such as evidence of ownership of property, evidence of title, information about ownership of collateral, information about condition of collateral, information about the location of collateral, information about a party's identity, information about a party's creditworthiness, information about a party's activities or behavior, information about a party's business practices, information about the status of performance of a contract, information about accounts receivable, information about accounts payable, information about the value of collateral, and many other types of information. In embodiments, a blockchain 3422, such as optionally distributed in a distributed ledger, may be used to configure a request for information 17862, along with terms and conditions 5210 related to the information, such as a reward 5212 for submission of the information 4418, a set of terms and conditions 5210 related to the use of the information 17862), and various parameters 5208, such as timing parameters, the nature of the information required (such as independently validated information like title records, video footage, photographs, witnessed statements, or the like), and other parameters 5208.

The blockchain and smart contract platform 5200 may include a crowdsourcing interface 5220, which may be included in or provided in coordination with a website, application, dashboard, communications system (such as for sending emails, texts, voice messages, advertisements, broadcast messages, or other messages), by which a message may be presented in the interface 5220 or sent to relevant individuals (whether targeted, such as in the case of a request to a particular individual, or broadcast, such as to individuals in a given location, company, organization, or the like) with an appropriate link to the smart contract 3431 and associated blockchain 3422, such that a reply message submitting information 4418, with relevant attachments, links, or other information, can be automatically associated (such as via an API or data integration system) with the blockchain 3422, such that the blockchain 3422, and any optionally associated distributed ledger, maintains a secure, definitive record of information 17862 submitted in response to the request. Where a reward 5212 is offered, the blockchain 3422 and/or smart contract 3431 may be used to record time of submission, the nature of the submission, and the party submitting, such that at such time as a submission satisfies the conditions for a reward 5212 (such as, for example, upon completion of a loan transaction in which the information 17862 was useful), the blockchain 3422 and any distributed ledger stored thereby can be used to identify the submitter and, by execution of the smart contract 3431, convey the reward 5212 (which may take any of the forms of consideration noted throughout this disclosure). In embodiments, the blockchain 3422 and any associated ledger may include identifying information for submissions of information 4418 without containing actual information 17862, such that information may be maintained secret (such as being encrypted or being stored separately with only identifying information), subject to satisfying or verifying conditions for access (such as identification or verification of a person who has legitimate access rights, such as by an identity or security application 3418). Rewards 5212 may be provided based on outcomes of cases or situations to which information 17862 relates, based on a set of rules (which may be automatically applied in some cases, such as using a smart contract 3431 in concert with an automation system, a rule processing system, an artificial intelligence system 3448 or other expert system, which in embodiments may comprise one that is trained on a training data set created with human experts). For example, a machine vision system may be used to evaluate evidence of the existence and/or condition of collateral based on images of items, and parties submitting information about collateral may be rewarded, such as via tokens or other consideration, via distribution of rewards 5212 through the smart contract 3431, blockchain 3422 and any distributed ledger. Thus, the blockchain and smart contract platform 5200 may be used for a wide variety of fact-gathering and information-gathering purposes, to facilitate validation of collateral, to validate representations about behavior, to validate occurrence of conditions of compliance, to validate occurrence of conditions of default, to deter improper behavior or misrepresentations, to reduce uncertainty, to reduce asymmetries of information, or the like.

In embodiments, information may relate to fact-gathering or data-gathering for a variety of applications and solutions that may be supported by a marketplace platform 3300, including the crowdsourcing platform 5220, such as for underwriting 3420 (e.g., of various types of loans, guarantees, and other items); risk management solutions 3408 (such as managing a wide variety of risks noted throughout this disclosure, such as risks associated with individual loans, packages of loans, tranches of loans and the like); lending solutions 3410 (such as evidence of the ownership and or value of collateral, evidence of the veracity of representations, evidence of performance or compliance with loan covenants, and the like); regulatory solutions 3426 (such as with respect to compliance with a wide range of regulations that may govern entities 3330 and processes, behaviors or activities of or by entities 3330); and fraud prevention solutions 3416 (such as to detect fraud, misrepresentation, improper behavior, libel, slander, and the like).

For example, a capital loan for a building may include a covenant regarding the use of the property, such as permitting certain uses and prohibiting others, permitting a given occupancy, or the like, and the crowdsourcing platform 5220 may solicit and provide consideration for compliance information about the building (e.g., requesting confirmation from the crowd that a building is in fact being used for its intended use as permitted by zone regulations). Crowd-sourced information may be combined with information from monitoring systems 3306. In embodiments, an adaptive intelligent systems layers 3304 may, for example, continuously monitor a property, an item of collateral 4802, or other entity 3330 and, upon recognition (such as by an AI system, such as a neural network classifier) of a suspicious event (e.g., one that may indicate violation of a loan covenant), the adaptive intelligent systems layers 3304 may provide a signal to the crowdsourcing system 5220 indicating that a crowdsourcing process should be initiated to verify the presence or absence of the violation. In embodiments, this may include classifying the covenant-related condition that using a machine classifier, providing the classification along with identifying data about an entity, and automatically configuring, such as based on a model or set of rules, a crowdsource request that identifies what information is requested about what entity 3330 and what reward 5212 is provided. In embodiment, rewards 5212 may be configured by experts, rewards 5212 may be based on a set of rules (such as ones that operate on parameters of the loan, the terms and conditions of a covenant in a smart contract 3431 (such as loan value, remaining term, and the like), the value of collateral 4802, or the like), and/or rewards 5212 may be set by robotic process automation 3442, such as where an RPA system 3442 is trained on a training set of expert activities in setting rewards in various contexts that collectively show what rewards are appropriate in given situations. Robotic process automation 3442 of reward configuration may be continuously improved by artificial intelligence 3448, such as based on a continuous feedback of outcomes of crowdsourcing, such as outcomes of success (e.g., verification of covenant defaults, yield outcomes, and the like).

Information gathering may include information gathering with respect to entities 3330 and their identities, assertions, claims, actions, or behaviors, among many other factors, and may be accomplished by crowdsourcing in the platform 5220 or by data collection systems 3318 and monitoring systems 3306, optionally with automation via process automation 3442 and adaptive intelligence, such as using an artificial intelligence system 3448.

Figure 53:
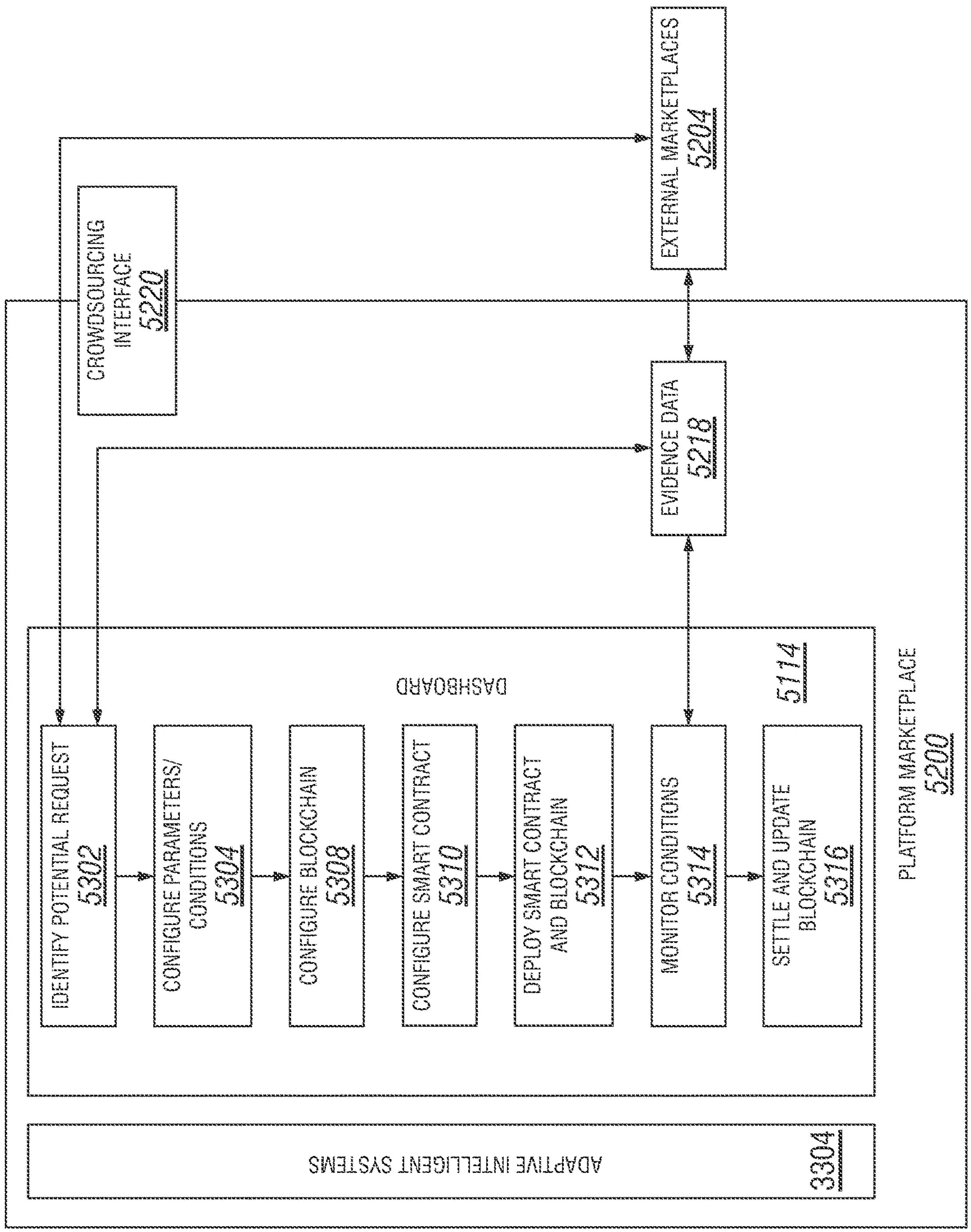
FIG. 53 depicts an embodiment of a crowdsourcing workflow enabled by a lending platform.

Referring to FIG. 53, a platform-operated marketplace crowdsourcing evidence 5220 may be configured, such as in a crowdsourcing interface 5220 or other user interface for an operator of the platform-operated marketplace 5201, using the various enabling capabilities of the data handling transactional, financial, and marketplace enablement system 3300 described throughout this disclosure. The operator may use the user interface or crowdsourcing dashboard 5414 to undertake a series of steps to perform or undertake an algorithm to create a crowdsourcing request for information 17862 as described in connection with FIG. 52. In embodiments, one or more of the steps of the algorithm to create a reward 5212 within the dashboard 5414 may include, at a component 5302, identifying potential rewards 5312, such as what information 5318 is likely to be of value in a given situation (such as may be indicated through various communication channels by stakeholders or representatives of an entity, such as an individual or enterprise, such as attorneys, agents, investigators, parties, auditors, detectives, underwriters, inspectors, and many others).

The dashboard 5414 may be configured with a crowdsourcing interface 5220, such as with elements (including application programming elements, data integration elements, messaging elements, and the like) that allow a crowdsourcing request to be managed in the platform marketplace 5201 and/or in one or more external marketplaces 5204. In the dashboard 5414, at a component 5304 the user may configure one or more parameters 5208 or conditions 5210, such as comprising or describing the conditions (of the type described herein) for the crowdsourcing request, such as by defining a set of conditions 5210 that trigger the reward 5212 and determine allocation of the reward 5212 to a set of submitters of information 5218. The user interface of the dashboard 5414, which may include or be associated with the crowdsourcing interface 5220, may include a set of drop down menus, tables, forms, or the like with default, templated, recommended, or pre-configured conditions, parameters 5208, conditions 5210 and the like, such as ones that are appropriate for various types of crowdsourcing requests. Once the conditions and other parameters of the request are configured, at a component 5308, a smart contract 3431 and blockchain 3422 may be configured to maintain, such as via a ledger, the data required to provision, allocate, and exchange data related to the request and to submissions of information 5218. The smart contract 3431 and blockchain 3422 may be configured to identity information, transaction information (such as for exchanges of information), technical information, other evidence data 518 of the type described in connection with FIG. 52, including any data, testimony, photo or video content or other information that may be relevant to a submission of information 5218 or the conditions 5210 for a reward 5212. At a component 5310, a smart contract 3431 may be configured to embody the conditions 5210 that were configured at the component 5304 and to operate on the blockchain 3422 that was created at the component 5308, as well as to operate on other data, such as data indicating facts, conditions, events, or the like in the platform-operated marketplace 5201 and/or an external marketplace 5204 or other information site or resource, such as ones related to submission data 4418, such as sites indicating outcomes of legal cases or portions of cases, sites reporting on investigations, and the like. The smart contract 3431 may be responsive to the configuration from component 5310 to apply one or more rules, execute one or more conditional operations, or the like upon data, such as evidence data 5218 and data indicating satisfaction of parameters 5208 or conditions 5210, as well as identity data, transactional data, timing data, and other data. Once configuration of one or more blockchains 3422 and one or more smart contracts 3431 is complete, at a component 5312, the blockchain 3422 and smart contract 3431 may be deployed in the platform-operated marketplace 5201, external marketplace 5204, or other site or environment, such as for interaction by one or more submitters or other users, who may, such as in a crowdsourcing interface 5220, such as a website, application, or the like, enter into the smart contract 3431, such as by submitting a submission of information 4418 and requesting the reward 5212, at which point the platform 5200, such as using the adaptive intelligent systems layers 3304 or other capabilities, may store relevant data, such as submission data 4418, identity data for the party or parties entering the smart contract 3431 on the blockchain 3422, or otherwise on the platform-operated marketplace 5201. At a component 5314, once the smart contract 3431 is executed, the platform 5201 may monitor, such as by the monitoring systems layer 3306, the platform-operated marketplace 5201 and/or one or more external marketplaces 5204 or other sites for submission data 4418, event data 3324, or other data that may satisfy or indicate satisfaction of one or more conditions 5210 or trigger application of one or more rules of the smart contract 3431, such as to trigger a reward 5212.

At a component 5316, upon satisfaction of conditions 5210, smart contracts 3431 may be settled, executed, or the like, resulting updates or other operations on the blockchain 3422, such as by transferring consideration (such as via a payments system) and transferring access to information 17862. Thus, via the above-referenced steps, an operator of the platform-operated marketplace 5201 may discover, configure, deploy, and have executed a set of smart contracts 3431 that crowdsource information relevant to a loan (such as information about value or condition of collateral 4802, compliance with covenants, fraud or misrepresentation, and the like) and that are cryptographically secured and transferred on a blockchain 3422 from information gatherers to parties seeking information. In embodiments, the adaptive intelligent systems layers 3304 may be used to monitor the steps of the algorithm described above, and one or more artificial intelligence systems may be used to automate, such as by robotic process automation 3442, the entire process or one or more sub-steps or sub-algorithms. This may occur as described above, such as by having an artificial intelligence system 3448 learn on a training set of data resulting from observations, such as monitoring software interactions of human users as they undertake the above-referenced steps. Once trained, the adaptive intelligent systems layers 3304 may thus enable the transactional, financial and marketplace enablement system 3300 to provide a fully automated platform for crowdsourcing of loan information.

Figure 54:
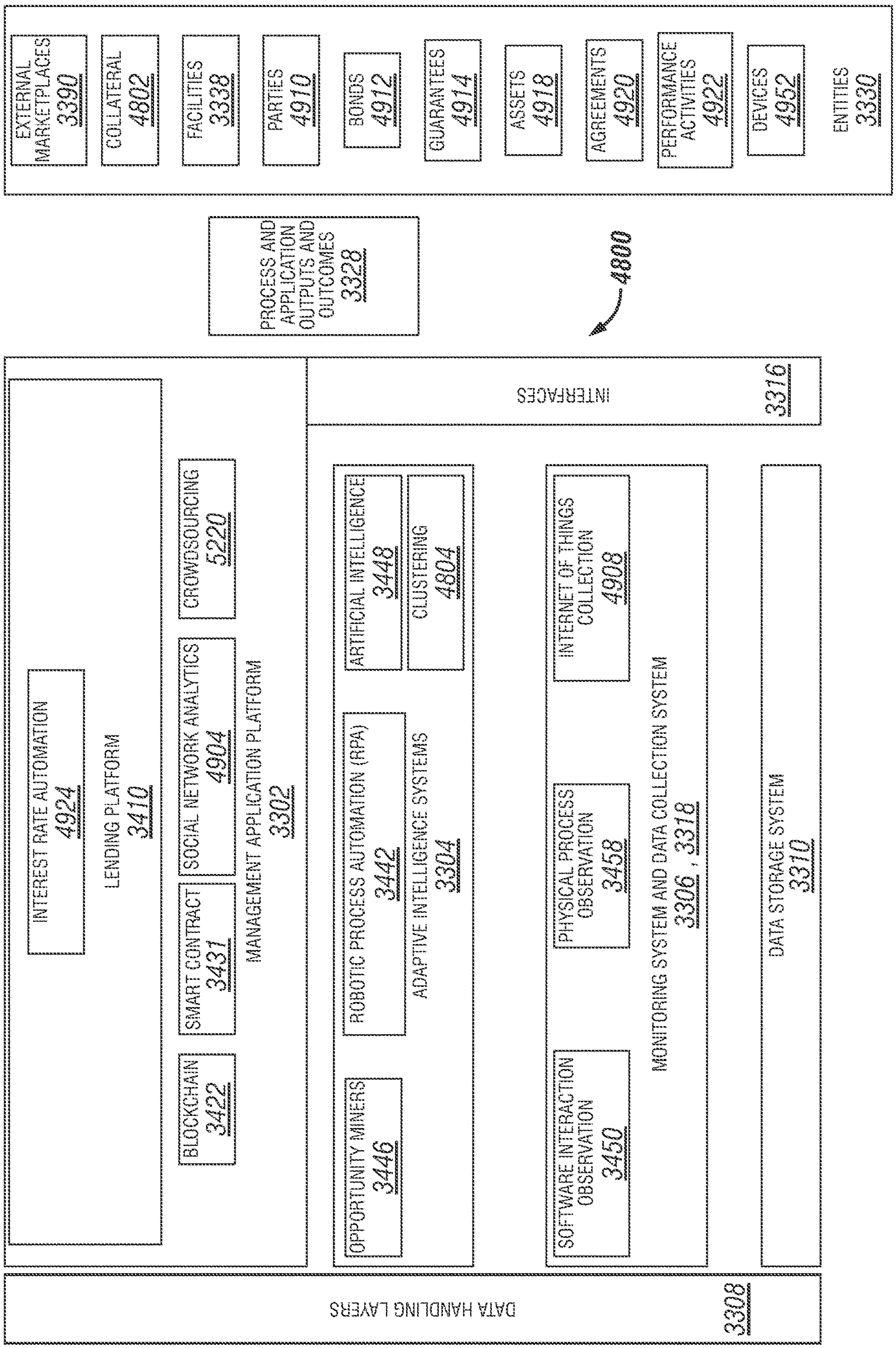
FIG. 54 depicts components and interactions of an embodiment of a lending platform having a smart contract system that automatically adjusts an interest rate for a loan based on information collected via at least one of an Internet of Things system, a crowdsourcing system, a set of social network analytic services and a set of data collection and monitoring services.

Referring to FIG. 54, in embodiments, a lending platform is provided having a smart contract system 3431 that automatically adjusts an interest rate for a loan based on information collected via at least one of an Internet of Things system, a crowdsourcing system, a set of social network analytic services and a set of data collection and monitoring services. The platform 4800 may include an interest rate automation solution 4924 that may include a set of interfaces, workflows, and models (which may include, use or be enabled by various adaptive intelligent systems layers 3304) and other components that are configured to enable automation of the setting of interest rates based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others). For example, a user of the interest rate automation solution 4924 may set (such as in a user interface) rules, thresholds, model parameters, and the like that determine, or recommend, an interest rate for a loan based on the above, such as based on interest rates available to the lender from secondary lenders, risk factors of the borrower (including predicted risk based on one or more predictive models using artificial intelligence 3448), or the system may automatically recommend or set such rules, thresholds, parameters and the like (optionally by learning to do so based on a training set of outcomes over time). Interest rates may be determined based on marketing factors (such as competing interest rates offered by other lenders). Interest rates may be calculated for new loans, for modifications of existing loans, for refinancing, for foreclosure situations (e.g., changing from secured loan rates to unsecured loan rates), and the like.

Figure 55:
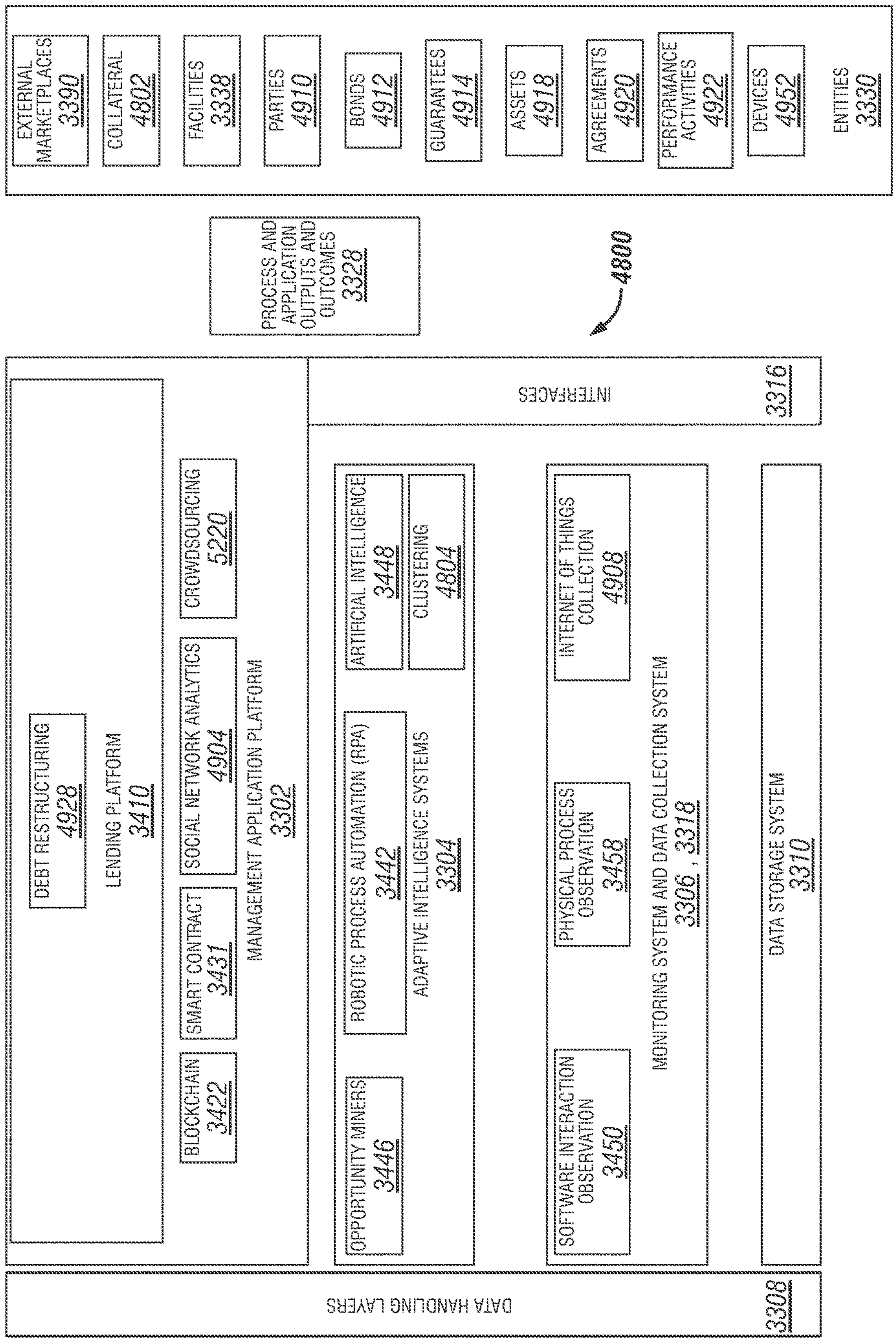
FIG. 55 depicts components and interactions of an embodiment of a lending platform having a smart contract that automatically restructures debt based on a monitored condition.

Smart Contract that Automatically Restructures Debt Based on a Monitored Condition Referring to FIG. 55, in embodiments, a lending platform is provided having a smart contract that automatically restructures debt based on a monitored condition. The platform 4800 may include a debt restructuring solution 4928 that may include a set of interfaces, workflows, and models (which may include, use or be enabled by various adaptive intelligent systems layers 3304) and other components that are configured to enable automation of the restructuring of debt based on a set of conditions, which may include smart contract 3431 terms and conditions, marketplace conditions (of platform marketplaces and/or external marketplaces 3390, conditions monitored by monitoring system layers 3306 and data collection systems 3318, and the like (such as of entities 3330, including without limitation parties 4910, collateral 4802 and assets 4918, among others)). For example, a user of the debt restructuring solution 4928 may create, configure (such as using one or more templates or libraries), modify, set or otherwise handle (such as in a user interface of the debt restructuring solution 4928) various rules, thresholds, procedures, workflows, model parameters, and the like that determine, or recommend, a debt restructuring action for a loan based on one or more events, conditions, states, actions, or the like, where restructuring may be based on various factors, such as prevailing market interest rates, interest rates available to the lender from secondary lenders, risk factors of the borrower (including predicted risk based on one or more predictive models using artificial intelligence 3448), status of other debt (such as new debt of a borrower, elimination of debt of a borrower, or the like), condition of collateral 4802 or assets 4918 used to secure or back a loan, state of a business or business operation (e.g., receivables, payables, or the like), and many others. Restructuring may include changes in interest rate, changes in priority of secured parties, changes in collateral 4802 or assets 4918 used to back or secure debt, changes in parties, changes in guarantors, changes in payment schedule, changes in principal balance (e.g., including forgiveness or acceleration of payments), and others. In embodiments, the debt restructuring solution 4928 may automatically recommend or set such rules, thresholds, actions, parameters and the like (optionally by learning to do so based on a training set of outcomes over time), resulting in a recommended restructuring plan, which may specify a series of actions required to accomplish a recommended restructuring, which may be automated and may involve conditional execution of steps based on monitored conditions and/or smart contract terms, which may be created, configured, and/or accounted for by the debt restructuring plan.

Restructuring plans may be determined and executed based at least one part on market factors (such as competing interest rates offered by other lenders, values of collateral, and the like), as well as regulatory and/or compliance factors. Restructuring plans may be generated and/or executed for modifications of existing loans, for refinancing, for foreclosure situations (e.g., changing from secured loan rates to unsecured loan rates), for bankruptcy or insolvency situations, for situations involving market changes (e.g., changes in prevailing interest rates) and others. In embodiments, adaptive intelligent systems layers 3304, including artificial intelligence 3448, may be trained on a training set of restructuring activities by experts and/or on outcomes of restructuring actions to generate a set of predictions, classifications, control instructions, plans, models, or the like for automated creation, management and/or execution of one or more aspects of a restructuring plan. In embodiments, provided herein is a smart contract system for modifying a loan, the system having a set of computational services. An example platform or system includes (a) a set of data collection and monitoring services for monitoring a set of entities involved in a loan; and (b) a set of smart contract services for managing a smart lending contract, wherein the set of smart contract services processes information from the set of data collection and monitoring services and automatically restructures debt based on a monitored condition. Certain further aspects of an example system are described following, any one or more of which may be present in certain embodiments.

Figure 56:
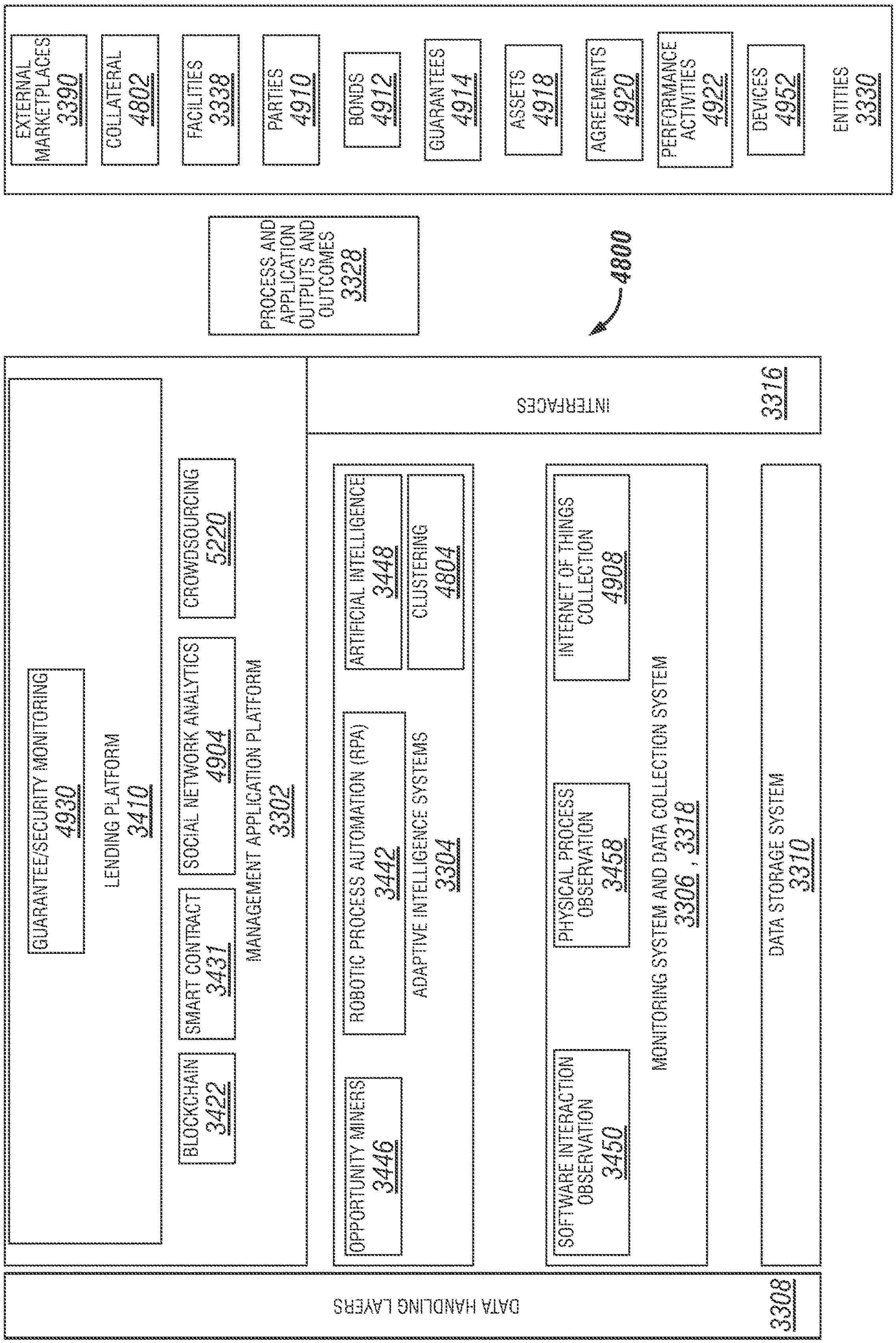
FIG. 56 depicts components and interactions of a lending platform having a set of data collection and monitoring systems for validating the reliability of a guarantee for a loan, including an Internet of Things system and a social network analytics system.

Referring to FIG. 56, in embodiments, a lending platform 4800 is provided having a social network analytics solution 4904 for validating the reliability of a guarantee for a loan. The platform 4800 may include a guarantee and/or security monitoring solution 4930 that may include a set of interfaces, workflows, and models (which may include, use or be enabled by various adaptive intelligent systems layers 3304) and other components that are configured to enable monitoring of a guarantee and/or security for a lending transaction based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others). For example, a user of the guarantee and/or security monitoring solution 4930 may set (such as in a user interface) rules, thresholds, model parameters, and the like that determine, or recommend, a monitoring plan for lending transaction such as based on risk factors of the borrower, risk factors of the lender, market risk factors, and/or risk factors of collateral 4802 or assets 4918 (including predicted risk based on one or more predictive models using artificial intelligence 3448), or the platform 4800 may automatically recommend or set such rules, thresholds, parameters and the like (optionally by learning to do so based on a training set of outcomes over time). The guarantee and/or security monitoring solution 4930 may configure a set of social network analytics solutions 4904 and/or other monitoring system layers 3306 and/or data collection systems 3318 to search, parse, extract, and process data from one or more social networks, websites, or the like, such as ones that may contain information about collateral 4802 or assets 4918 (e.g., photos that show a vehicle, boat, or other personal property of a party 4910, photos of a home or other real property, photos or text that describes activities of a party 4910 (including ones that indicate financial risk, physical risk, health risk, or other risk that may be relevant to the quality of the guarantor and/or the guarantee for a payment obligation and/or the ability of the borrower to repay a loan when due)). For example, a photo showing a borrower driving a regular passenger vehicle in off-road conditions may be flagged as indicating that the vehicle cannot be fully relied upon as collateral for an automobile loan that has a high remaining balance.

Social Network Monitoring System for Validating Quality of a Personal Guarantee for a Loan Thus, in embodiments, provided herein is a social network monitoring system for validating conditions of a guarantee for a loan. An example platform or system includes (a) a set of social network data collection and monitoring services by which data is collected by a set of algorithms that are configured to monitor social network information about entities involved in a loan; and (b) an interface to the set of social networking services that enables configuration of parameters of the social network data collection and monitoring services to obtain information related to the condition of guarantee. Certain further aspects of an example system are described following, any one or more of which may be present in certain embodiments.

An example system includes where the set of social network data collection and monitoring services obtains information about the financial condition of an entity that is the guarantor for the loan.

An example system includes where the financial condition is determined at least in part based on information contained in a social network about the entity selected from among a publicly stated valuation of the entity, a set of property owned by the entity as indicated by public records, a valuation of a set of property owned by the entity, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity.

An example system includes where the loan is of at least one type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the platform or system may further include an interface of the social network data collection and monitoring services. An example system includes where the data collection and monitoring service is configured to obtain information about conditions of a set of collateral for the loan, wherein the set of collateral items is selected from among a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system includes where condition of collateral includes condition attributes selected from the group consisting of the quality of the collateral, the condition of the collateral, the status of title to the collateral, the status of possession of the collateral, the status of a lien on the collateral, a new or used status of item, a type of item, a category of item, a specification of an item, a product feature set of an item, a model of item, a brand of item, a manufacturer of item, a status of item, a context of item, a state of item, a value of item, a storage location of item, a geolocation of item, an age of item, a maintenance history of item, a usage history of item, an accident history of an item, a fault history of an item, an ownership of an item, an ownership history of an item, a price of a type of item, a value of a type of item, an assessment of an item, and a valuation of an item.

An example system includes where the interface is a graphical user interface configured to enable a workflow by which a human user enters parameters to establish the social network data collection and monitoring request.

An example system includes where the platform or system may further include a set of smart contract services that administer a smart lending contract, wherein the smart contract services process information from the set of social network data collection and monitoring services and automatically undertake an action related to the loan.

An example system includes where the action is at least one of a foreclosure action, a lien administration action, an interest-rate setting action, a default initiation action, a substitution of collateral, and a calling of the loan.

An example system includes where the platform or system may further include a robotic process automation system that is trained, based on a training set of interactions of human users with the interface to the set of social network data collection and monitoring services, to configure a data collection and monitoring action based on a set of attributes of a loan.

An example system includes where the attributes of the loan are obtained from a set of smart contract services that manage the loan.

An example system includes where the robotic process automation system is configured to be iteratively trained and improved based on a set of outcomes from a set of social network data collection and monitoring requests.

An example system includes where training includes training the robotic process automation system to determine a set of domains to which the social network data collection and monitoring services will applied.

An example system includes where training includes training the robotic process automation system to configure the content of a social network data collection and monitoring search.

IoT Data Collection and Monitoring System for Validating Quality of a Personal Guarantee for a Loan Referring still to FIG. 56, in embodiments, a lending platform is provided having an Internet of Things data collection and monitoring system for validating reliability of a guarantee for a loan. The guarantee and/or security monitoring solution 4930 may include the capability to use data from, and configure collection activities by, a set of Internet of Things services 4908 (which may include various IoT devices, edge devices, edge computation and processing capabilities, and the like as described in connection with various embodiments), such as ones that monitor various entities 3330 and their environments involved in lending transactions.

In embodiments, provided herein is a monitoring system for validating conditions of a guarantee for a loan. For example, a set of algorithms may be configured to initiate data collection by IoT devices, to manage data collection, and the like such as based on the conditions referenced above, including conditions that relate to risk factors of the borrower or lender, market risk factors, physical risk factors, or the like. For example, an IoT system may be configured to capture video or images of a home during periods of bad weather, such as to determine whether the home is at risk of a flood, wind damage, or the like, in order to confirm whether the home can be predicted to serve as adequate collateral for a home loan, a line of credit, or other lending transaction.

An example platform or system includes (a) a set of Internet of Things data collection and monitoring services by which data is collected by a set of algorithms that are configured to monitor Internet of Things information collected from and about entities involved in a loan; and (b) an interface to the set of Internet of Things data collection and monitoring services that enables configuration of parameters of the social network data collection and monitoring services to obtain information related to the condition of guarantee. Certain further aspects of an example system are described following, any one or more of which may be present in certain embodiments.

An example system includes where the set of Internet of Things data collection and monitoring services obtains information about the financial condition of an entity that is the guarantor for the loan.

An example system includes where the financial condition is determined at least in part based on information collected by an Internet of Things device about the entity selected from among a publicly stated valuation of the entity, a set of property owned by the entity as indicated by public records, a valuation of a set of property owned by the entity, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity.

An example system includes where the loan is of at least one type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the platform or system may further include an interface of the set of Internet of Things data collection and monitoring services. An example system includes where the set of data collection and monitoring services is configured to obtain information about conditions of a set of collateral for the loan, wherein the set of collateral items is selected from among a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system includes where condition of collateral includes condition attributes selected from the group consisting of the quality of the collateral, the condition of the collateral, the status of title to the collateral, the status of possession of the collateral, the status of a lien on the collateral, a new or used status of item, a type of item, a category of item, a specification of an item, a product feature set of an item, a model of item, a brand of item, a manufacturer of item, a status of item, a context of item, a state of item, a value of item, a storage location of item, a geolocation of item, an age of item, a maintenance history of item, a usage history of item, an accident history of an item, a fault history of an item, an ownership of an item, an ownership history of an item, a price of a type of item, a value of a type of item, an assessment of an item, and a valuation of an item.

An example system includes where the interface is a graphical user interface configured to enable a workflow by which a human user enters parameters to establish an Internet of Things data collection and monitoring services monitoring action.

An example system includes where the platform or system may further include a set of smart contract services that administer a smart lending contract, wherein the set of smart contract services process information from the set of Internet of Things data collection and monitoring services and automatically undertakes an action related to the loan.

An example system includes where the action is at least one of a foreclosure action, a lien administration action, an interest-rate setting action, a default initiation action, a substitution of collateral, and a calling of the loan.

An example system includes where the platform or system may further include a robotic process automation system that is trained, based on a training set of interactions of human users with the interface to the set of Internet of Things data collection and monitoring services, to configure a data collection and monitoring action based on a set of attributes of a loan.

An example system includes where the attributes of the loan are obtained from a set of smart contract services that manage the loan.

An example system includes where the robotic process automation system is configured to be iteratively trained and improved based on a set of outcomes from a set of Internet of Things data collection and monitoring services activities.

An example system includes where training includes training the robotic process automation system to determine a set of domains to which the Internet of Things data collection and monitoring services will applied.

An example system includes where training includes training the robotic process automation system to configure the content of Internet of Things data collection and monitoring services activities.

Oracles

In embodiments, oracles may be deployed to collect data from specific data sources and report the data to a distributed ledger network. In embodiments, an oracle may be deployed to access data from off-chain sources, such as from legacy systems, IoT networks, connected products, and/or the like. In this way, an oracle may bridge off-chain ecosystems to on-chain ecosystems. In some embodiments, oracles may be deployed to access data that is used by one or more smart contracts that auto-execute actions based thereon. For example, a smart contract may be configured to take a specific action (e.g., auto-execute a transaction, automatically write data to a blockchain, transfer an asset from one entity to another entity, and/or the like) upon detecting a specified triggering event (e.g., as defined in the programmatic logic of the smart contract) that is determined at least in part on off-chain data. In these examples, an oracle may collect data from one or more designated data sources and may process and/or structure the data, such that the data (or a derivation therefrom) may be reported to the smart contract. It is appreciated that an oracle may be configured to aggregate, fuse, and/or otherwise process data from one or more data sources to obtain "oracle data". Oracle data may refer to data that is output by an oracle to a distributed ledger network (e.g., a smart contract or other software/hardware that interfaces with a distributed ledger).

In embodiments, an interface configuration system may be configured to configure digital interfaces (e.g., application programming interfaces (APIs)) that facilitate communication between on-chain and off-chain ecosystems. In embodiments, the digital interfaces may include APIs for collecting data from one or more off-chain data sources that is provided to an on-chain ecosystem and/or providing data from the on-chain ecosystem to one or more off-chain devices or systems. In some of these embodiments, the APIs may be smart APIs that process data received by from one or more data sources to obtain analytics, classifications, predictions, and/or inferences from the collected data. In these embodiments, a smart API may report the analytics, classifications, predictions and/or inferences to a designated system (e.g., distributed ledger network, centralized system, and/or the like).

In some embodiments, the interface configuration system may configure oracles that collect and report on data for an on-chain ecosystem (e.g., specific smart contract or set of smart contracts). In some of these embodiments, the oracle may be deployed as part of a digital network interface (e.g., as a component of an API) and deployed to a computing network (e.g., a centralized cloud service, a decentralized network of computing nodes and/or the like). In some of these embodiments, the interface configuration system may also configure programmatic logic (e.g., scripts, plug-ins, or the like) that may be installed at off-chain data sources (e.g., centralized computing systems, IoT devices, connected products, public or private databases, and/or the like), whereby the programmatic logic instructs a respective off-chain data source on what type(s) of data to collect and report, when to report the data to the oracle, and how to report the data to the oracle. For example, the programmatic logic may indicate the type or types of data that are to be collected and may define a schedule and/or conditions for reporting to report one or more specific types of data off-chain devices In embodiments, the interface configuration system may configure oracles to be deployed for a particular purpose (e.g., serving specific types of data to a particular smart contract or for a group of smart contracts) using predefined oracle templates. In embodiments, oracle templates may include a set of modules that may be implemented in furtherance of the particular purpose.

These may include modules for creating and maintaining an API, modules for processing received data (e.g., filtering, fusing, cleaning, or the like), and modules for reporting the data to a consumer of the data (e.g., a smart contract). In these embodiments, a user or an intelligence system may provide oracle parameterization data that the interface configuration system utilizes to select and configure an oracle template. For example, the oracle parameterization data may define a set of device types in a digital product network that are allowed to report to the oracle, the types of data that the devices are to report to the oracle, data processing techniques to be applied to the collected data, conditions that trigger a reporting workflow, one or more smart contracts that receive the data, and/or the like. In response, the interface configuration module may retrieve an oracle template from a library and may parameterize the template based on the oracle parameterization data. In some of these embodiments, the interface configuration module may further configure a set of scripts or other suitable instruction sets that may be distributed to the oracle data sources (e.g., the set of devices in the digital product network), whereby the script will instruct the data sources on what type of data to collect, how to structure the data (e.g., a schema for reporting the data), and how to interface with the configured oracle. Once configured, an oracle may be deployed to a server, thereby exposing the API to the oracle data sources. The oracle may then collect data from the data sources and report to the intended recipient (e.g., a particular smart contract).

RPA Systems

Figure 57:
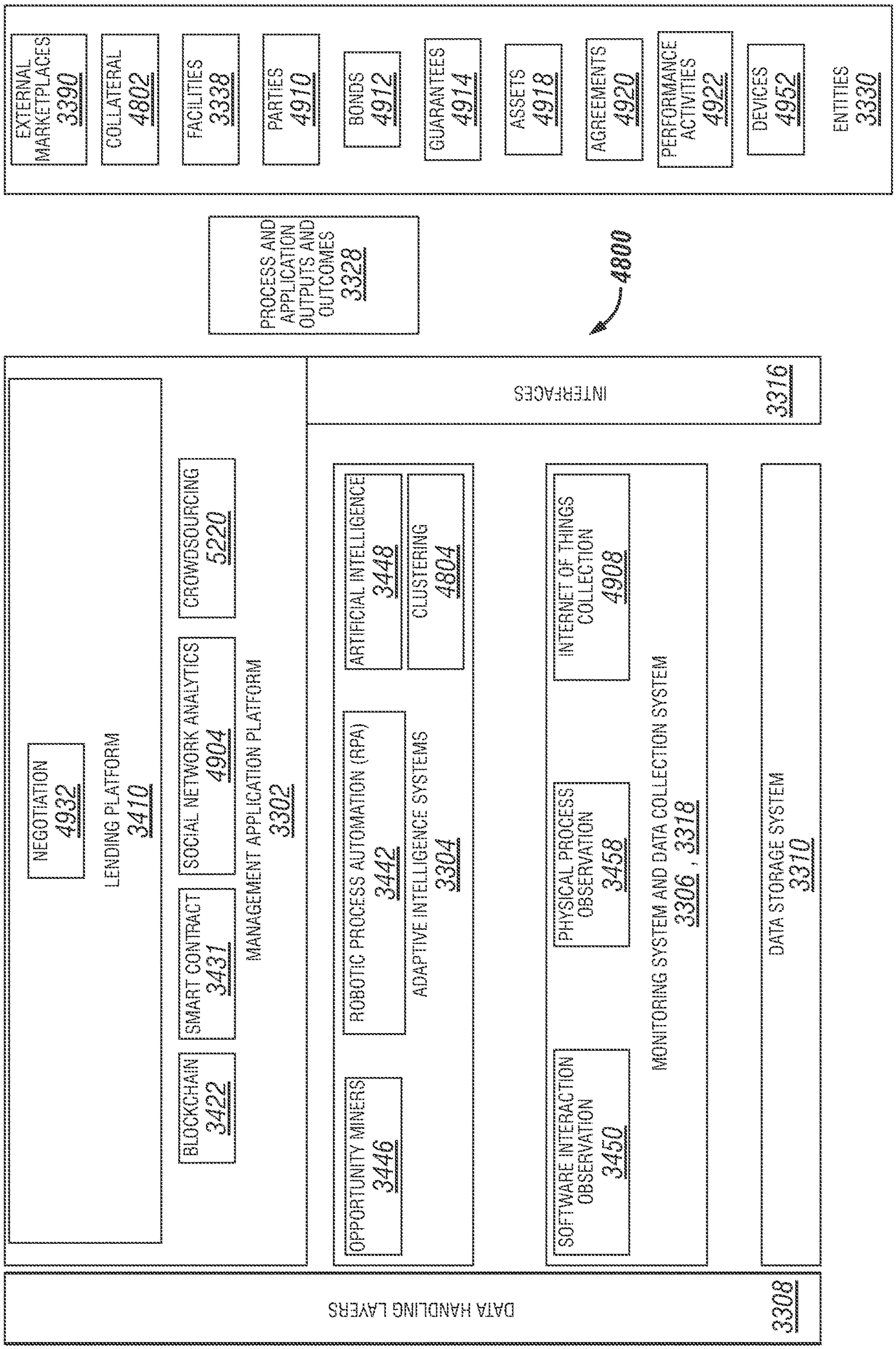
FIG. 57 depicts components and interactions of a lending platform having a robotic process automation system for negotiation of a set of terms and conditions for a loan.

An RPA Bank Loan Negotiator Trained on a Training Set of Expert Lender Interactions with Borrowers Referring to FIG. 57, in embodiments, a lending platform is provided having a robotic process automation system 3442 for negotiation of a set of terms and conditions for a loan. The RPA system 3442 may provide automation for one or more aspects of a negotiation solution 4932 that enables automated negotiation and/or provides a recommendation or plan for a negotiation relevant to a lending transaction. The negotiation solution 4932 and/or RPA system 3442 for negotiation may include a set of interfaces, workflows, and models (which may include, use, or be enabled by various adaptive intelligent systems layers 3304) and other components that are configured to enable automation of one or more aspects of a negotiation of one or more terms and conditions of a lending transaction, such as based on a set of conditions, which may include smart contract 3431 terms and conditions, marketplace conditions (of platform marketplaces and/or external marketplaces 3390, conditions monitored by monitoring system layers 3306 and data collection systems 3318, and the like (such as of entities 3330, including without limitation parties 4910, collateral 4802 and assets 4918, among others)). For example, a user of the negotiation solution 4932 may create, configure (such as using one or more templates or libraries), modify, set, or otherwise handle (such as in a user interface of the negotiation solution 4932 and/or RPA system 3442) various rules, thresholds, conditional procedures, workflows, model parameters, and the like that determine, or recommend, a negotiation action or plan for a lending transaction negotiation based on one or more events, conditions, states, actions, or the like, where the negotiation plan may be based on various factors, such as prevailing market interest rates, interest rates available to the lender from secondary lenders, risk factors of the borrower, the lender, one or more guarantors, market risk factors, and the like (including predicted risk based on one or more predictive models using artificial intelligence 3448), status of debt, condition of collateral 4802 or assets 4918 used to secure or back a loan, state of a business or business operation (e.g., receivables, payables, or the like), conditions of parties 4910 (such as net worth, wealth, debt, location, and other conditions), behaviors of parties (such as behaviors indicating preferences, behaviors indicating negotiation styles), and many others. Negotiation may include negotiation of lending transaction terms and conditions, debt restructuring, foreclosure activities, setting interest rates, changes in interest rate, changes in priority of secured parties, changes in collateral 4802 or assets 4918 used to back or secure debt, changes in parties, changes in guarantors, changes in payment schedule, changes in principal balance (e.g., including forgiveness or acceleration of payments), and many other transactions or terms and conditions. In embodiments, the negotiation solution 4932 may automatically recommend or set rules, thresholds, actions, parameters, and the like (optionally by learning to do so based on a training set of outcomes over time), resulting in a recommended negotiation plan, which may specify a series of actions required to accomplish a recommended or desired outcome of negotiation (such as within a range of acceptable outcomes), which may be automated and may involve conditional execution of steps based on monitored conditions and/or smart contract terms, which may be created, configured, and/or accounted for by the negotiation plan. Negotiation plans may be determined and executed based at least one part on market factors (such as competing interest rates offered by other lenders, values of collateral, and the like) as well as regulatory and/or compliance factors. Negotiation plans may be generated and/or executed for creation of new loans, for creation of guarantees and security, for secondary loans, for modifications of existing loans, for refinancing, for foreclosure situations (e.g., changing from secured loan rates to unsecured loan rates), for bankruptcy or insolvency situations, for situations involving market changes (e.g., changes in prevailing interest rates), and others. In embodiments, adaptive intelligent systems layers 3304, including artificial intelligence 3448, may be trained on a training set of negotiation activities by experts and/or on outcomes of negotiation actions to generate a set of predictions, classifications, control instructions, plans, models, or the like for automated creation, management and/or execution of one or more aspects of a negotiation plan.

In embodiments, provided herein is a robotic process automation system for negotiating a loan. An example platform or system includes (a) a set of data collection and monitoring services for collecting a training set of interactions among entities for a set of loan transactions; (b) an artificial intelligence system that is trained on the training set of interactions to classify a set of loan negotiation actions; and (c) a robotic process automation system that is trained on a set of loan transaction interactions and a set of loan transaction outcomes to negotiate the terms and conditions of a loan on behalf of a party to a loan. Certain further aspects of an example system are described following, any one or more of which may be present in certain embodiments.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities, and a set of crowdsourcing services configured to solicit and report information related to the entities.

An example system includes where the entities are a set of parties to a loan transaction.

An example system includes where the set of parties is selected from among a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system includes where the robotic process automation is trained on a set of interactions of parties with a set of user interfaces involved in a set of lending processes.

An example system includes where upon completion of negotiation of a smart contract for a loan is automatically configured by a set of smart contract services based on the outcome of the negotiation.

An example system includes where at least one of an outcome and a negotiating event of the negotiation is recorded in a distributed ledger associated with the loan.

An example system includes where the loan is of a type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An RPA Bank Loan Refinancing Negotiator Trained on a Training Set of Expert Lender Re-Financing Interactions with Borrowers In embodiments, provided herein is a robotic process automation system for negotiating refinancing of a loan. An example platform or system includes (a) a set of data collection and monitoring services for collecting a training set of interactions between entities for a set of loan refinancing activities; (b) an artificial intelligence system that is trained on the training set of interactions to classify a set of loan refinancing actions; and (c) a robotic process automation system that is trained on a set of loan refinancing interactions and a set of loan refinancing outcomes to undertake a loan refinancing activity on behalf of a party to a loan. Certain further aspects of an example system are described following, any one or more of which may be present in certain embodiments.

An example system includes where the loan refinancing activity includes initiating an offer to refinance, initiating a request to refinance, configuring a refinancing interest rate, configuring a refinancing payment schedule, configuring a refinancing balance, configuring collateral for a refinancing, managing use of proceeds of a refinancing, removing or placing a lien associated with a refinancing, verifying title for a refinancing, managing an inspection process, populating an application, negotiating terms and conditions for a refinancing, and closing a refinancing.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities, and a set of crowdsourcing services configured to solicit and report information related to the entities.

An example system includes where the entities are a set of parties to a loan transaction.

An example system includes where the set of parties is selected from among a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system includes where the robotic process automation is trained on a set of interactions of parties with a set of user interfaces involved in a set of lending processes.

An example system includes where upon completion of a refinancing process a smart contract for a refinance loan is automatically configured by a set of smart contract services based on the outcome of the refinancing activity.

An example system includes where at least one of an outcome and an event of the refinancing is recorded in a distributed ledger associated with the refinancing loan.

An example system includes where the loan is of a type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

Figure 58:
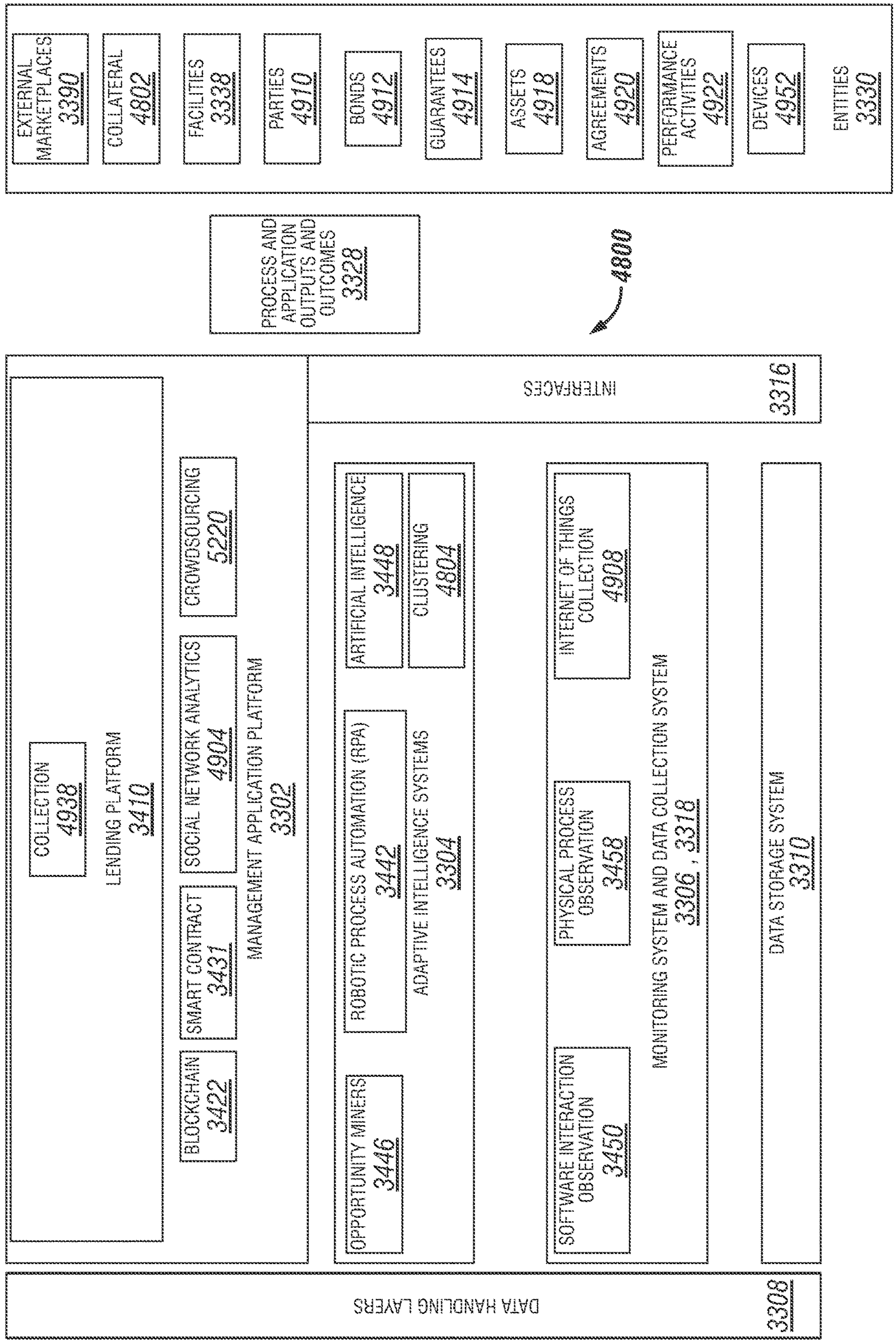
FIG. 58 depicts components and interactions of a lending platform having a robotic process automation system for loan collection.

An RPA Bank Loan Collector Trained on a Training Set of Expert Collection Interactions with Borrowers Referring to FIG. 58, in embodiments, a lending platform is provided having a robotic process automation system for loan collection. The RPA system 3442 may provide automation for one or more aspects of a collection solution 4938 that enables automated collection and/or provides a recommendation or plan for a collection activity relevant to a lending transaction. The collection solution 4938 and/or RPA system 3442 for collection may include a set of interfaces, workflows, and models (which may include, use or be enabled by various adaptive intelligent systems layers 3304) and other components that are configured to enable automation of one or more aspects of a collection action of one or more terms and conditions of a collection process for a lending transaction, such as based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others). For example, a user of the collection solution 4938 may create, configure (such as using one or more templates or libraries), modify, set or otherwise handle (such as in a user interface of the collection solution 4938 and/or RPA system 3442) various rules, thresholds, conditional procedures, workflows, model parameters, and the like that determine, or recommend, a collection action or plan for a lending transaction or loan monitoring solution based on one or more events, conditions, states, actions, or the like, where the collection plan may be based on various factors, such as the status of payments, the status of the borrower, the status of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 used to secure or back a loan, state of a business or business operation (e.g., receivables, payables, or the like), conditions of parties 4910 (such as net worth, wealth, debt, location, and other conditions), behaviors of parties (such as behaviors indicating preferences, behaviors indicating how borrowers respond to communication styles, communication cadence, and the like), and many others. Collection may include collection with respect to loans, communications to encourage payments, and the like. In embodiments, the collection solution 4938 may automatically recommend or set rules, thresholds, actions, parameters, and the like (optionally by learning to do so based on a training set of outcomes over time), resulting in a recommended collection plan, which may specify a series of actions required to accomplish a recommended or desired outcome of collection (such as within a range of acceptable outcomes), which may be automated and may involve conditional execution of steps based on monitored conditions and/or smart contract terms, which may be created, configured, and/or accounted for by the collection plan. Collection plans may be determined and executed based at least one part on market factors (such as competing interest rates offered by other lenders, values of collateral, and the like), as well as regulatory and/or compliance factors. Collection plans may be generated and/or executed for creation of new loans, for secondary loans, for modifications of existing loans, for refinancing, for foreclosure situations (e.g., changing from secured loan rates to unsecured loan rates), for bankruptcy or insolvency situations, for situations involving market changes (e.g., changes in prevailing interest rates), and others. In embodiments, adaptive intelligent systems layers 3304, including artificial intelligence 3448, may be trained on a training set of collection activities by experts and/or on outcomes of collection actions to generate a set of predictions, classifications, control instructions, plans, models, or the like for automated creation, management and/or execution of one or more aspects of a collection plan.

In embodiments, provided herein is a robotic process automation system for handling collection of a loan. An example platform or system includes (a) a set of data collection and monitoring services for collecting a training set of interactions among entities for a set of loan transactions that involve collection of a set of payments for a set of loans; (b) an artificial intelligence system that is trained on the training set of interactions to classify a set of loan collection actions; and (c) a robotic process automation system that is trained on a set of loan transaction interactions and a set of loan collection outcomes to undertake a loan collection action on behalf of a party to a loan. Certain further aspects of an example system are described following, any one or more of which may be present in certain embodiments.

An example system includes where the loan collection action undertaken by the robotic process automation system is selected from among initiation of a collection process, referral of a loan to an agent for collection, configuration of a collection communication, scheduling of a collection communication, configuration of content for a collection communication, configuration of an offer to settle a loan, termination of a collection action, deferral of a collection action, configuration of an offer for an alternative payment schedule, initiation of a litigation, initiation of a foreclosure, initiation of a bankruptcy process, a repossession process, and placement of a lien on collateral.

Figure 59:
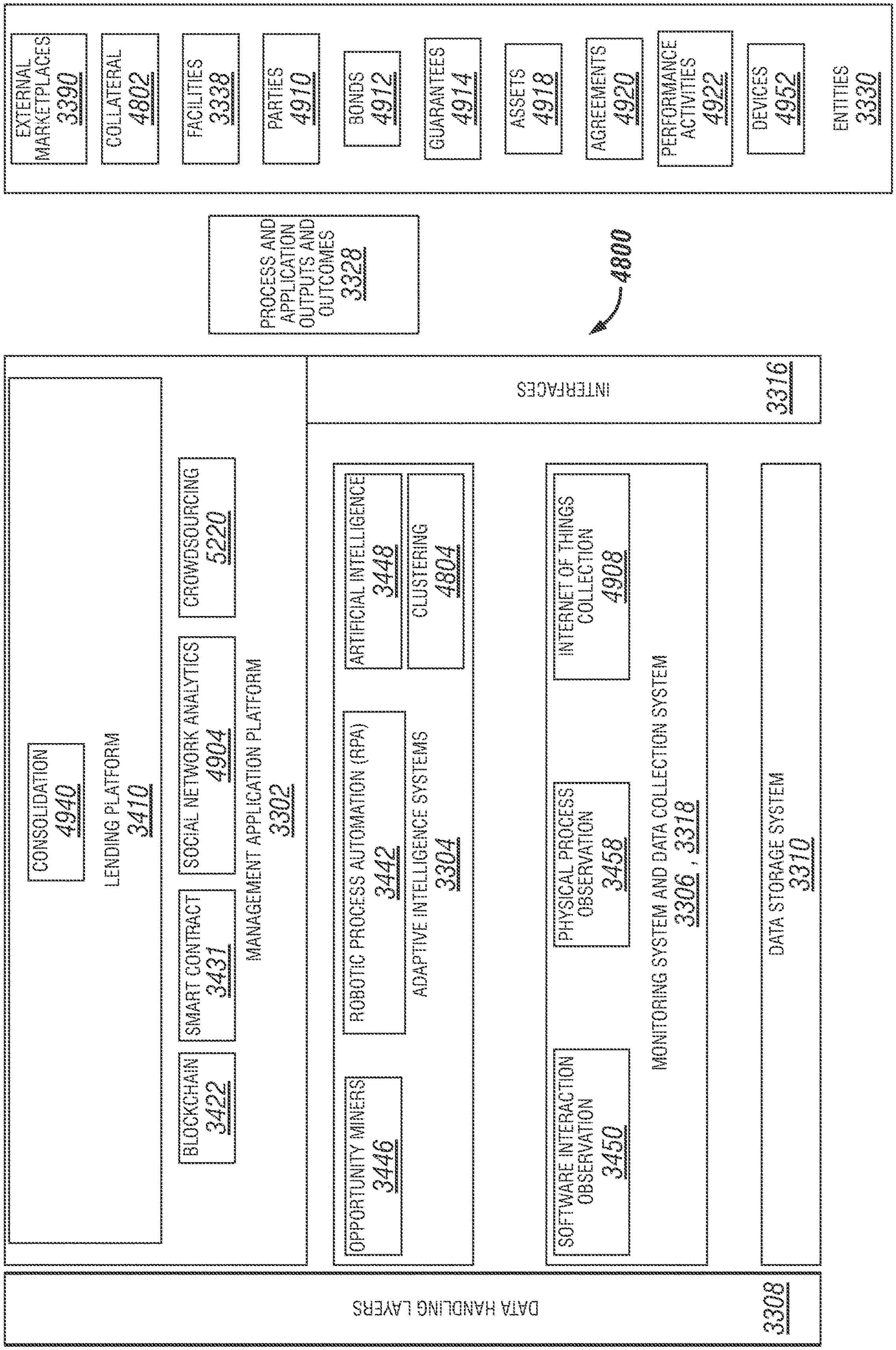
FIG. 59 depicts components and interactions of a lending platform having a robotic process automation system for consolidating a set of loans.

An RPA Bank Loan Consolidator Trained on a Training Set of Expert Consolidation Interactions with Other Lenders Referring to FIG. 59, in embodiments a lending platform is provided having a robotic process automation system for consolidating a set of loans. The RPA system 3442 may provide automation for one or more aspects of a consolidation solution 4940 that enables automated consolidation and/or provides a recommendation or plan for a consolidation activity relevant to a lending transaction. The consolidation solution 4940 and/or RPA system 3442 for consolidation may include a set of interfaces, workflows, and models (which may include, use or be enabled by various adaptive intelligent systems layers 3304) and other components that are configured to enable automation of one or more aspects of a consolidation action or a consolidation process for a lending transaction, such as based on a set of conditions, which may include smart contract 3431 terms and conditions, marketplace conditions (of platform marketplaces and/or external marketplaces 3390, conditions monitored by monitoring system layers 3306 and data collection systems 3318), and the like (such as of entities 3330, including without limitation parties 4910, collateral 4802 and assets 4918, among others). For example, a user of the consolidation solution 4940 may create, configure (such as using one or more templates or libraries), modify, set or otherwise handle (such as in a user interface of the consolidation solution 4940 and/or RPA system 3442) various rules, thresholds, conditional procedures, workflows, model parameters, and the like that determine, or recommend, a consolidation action or plan for a lending transaction or a set of loans based on one or more events, conditions, states, actions, or the like, where the consolidation plan may be based on various factors, such as the status of payments, interest rates of the set of loans, prevailing interest rates in a platform marketplace or external marketplace, the status of the borrowers of a set of loans, the status of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 used to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences), and many others. Consolidation may include consolidation with respect to terms and conditions of sets of loans, selection of appropriate loans, configuration of payment terms for consolidated loans, configuration of payoff plans for pre-existing loans, communications to encourage consolidation, and the like. In embodiments, the consolidation solution 4940 may automatically recommend or set rules, thresholds, actions, parameters, and the like (optionally by learning to do so based on a training set of outcomes over time), resulting in a recommended consolidation plan, which may specify a series of actions required to accomplish a recommended or desired outcome of consolidation (such as within a range of acceptable outcomes), which may be automated and may involve conditional execution of steps based on monitored conditions and/or smart contract terms, which may be created, configured, and/or accounted for by the consolidation plan. Consolidation plans may be determined and executed based at least one part on market factors (such as competing interest rates offered by other lenders, values of collateral, and the like) as well as regulatory and/or compliance factors. Consolidation plans may be generated and/or executed for creation of new consolidated loans, for secondary loans related to consolidated loans, for modifications of existing loans related to consolidation, for refinancing terms of a consolidated loan, for foreclosure situations (e.g., changing from secured loan rates to unsecured loan rates), for bankruptcy or insolvency situations, for situations involving market changes (e.g., changes in prevailing interest rates), and others. In embodiments, adaptive intelligent systems layers 3304, including artificial intelligence 3448, may be trained on a training set of consolidation activities by experts and/or on outcomes of consolidation actions to generate a set of predictions, classifications, control instructions, plans, models, or the like for automated creation, management and/or execution of one or more aspects of a consolidation plan.

In embodiments, provided herein is a robotic process automation system for consolidating a set of loans. An example platform or system includes (a) a set of data collection and monitoring services for collecting information about a set of loans and for collecting a training set of interactions between entities for a set of loan consolidation transactions: (b) an artificial intelligence system that is trained on the training set of interactions to classify a set of loans as candidates for consolidation; and (c) a robotic process automation system that is trained on a set of loan consolidation interactions to manage consolidation of at least a subset of the set of loans on behalf of a party to the consolidation.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities, and a set of crowdsourcing services configured to solicit and report information related to the entities.

Figure 60:
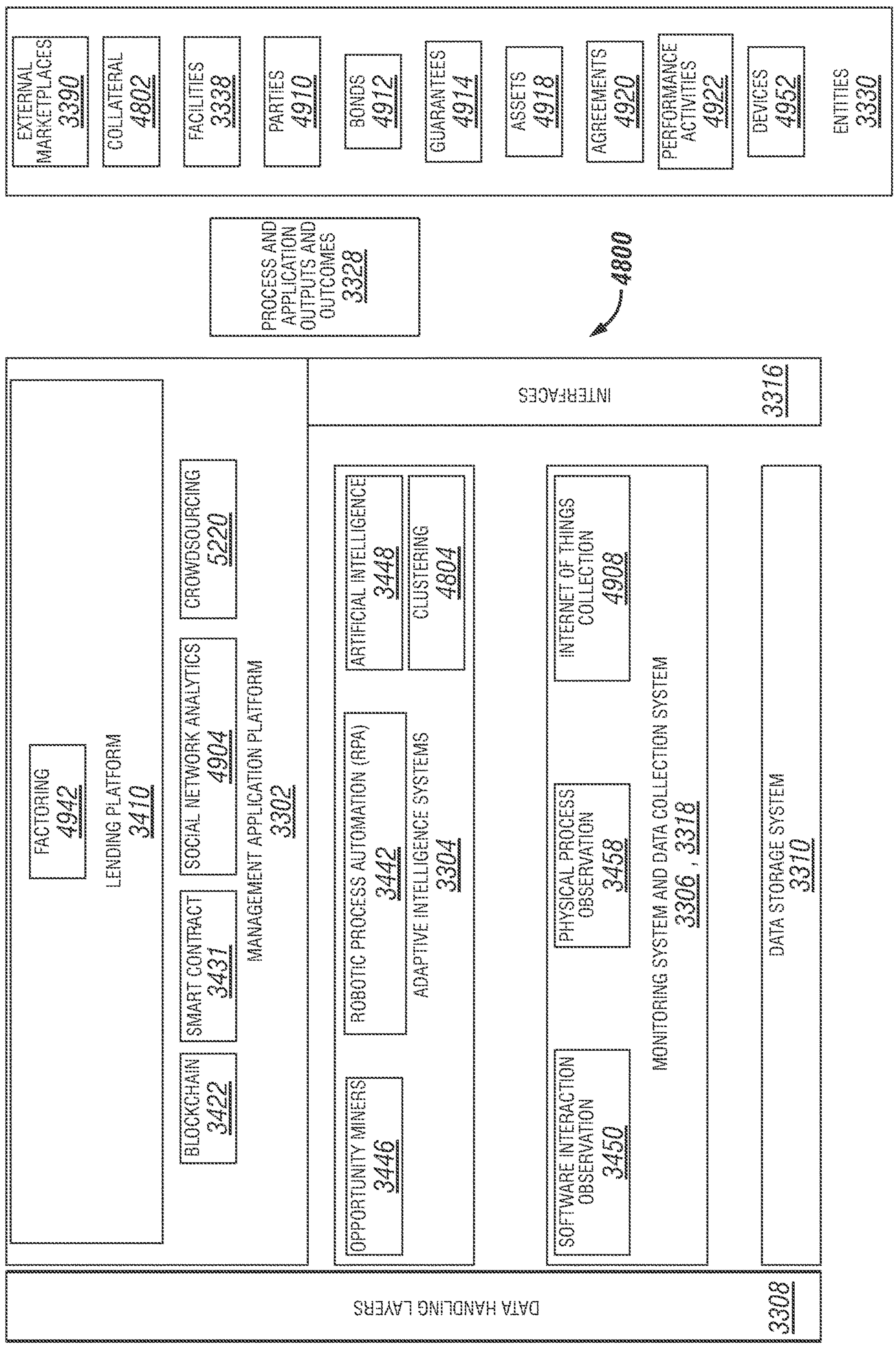
FIG. 60 depicts components and interactions of a lending platform having a robotic process automation system for managing a factoring loan.

An RPA Factoring Loan Negotiator Trained on a Training Set of Expert Factoring Interactions with Borrowers Referring to FIG. 60, in embodiments, a lending platform is provided having a robotic process automation system for managing a factoring transaction. The RPA system 3442 may provide automation for one or more aspects of a factoring solution 4942 that enables automated factoring and/or provides a recommendation or plan for a factoring activity relevant to a lending transaction, such as one involving factoring of receivables. The factoring solution 4942 and/or RPA system 3442 for factoring may include a set of interfaces, workflows, and models (which may include, use or be enabled by various adaptive intelligent systems layers 3304) and other components that are configured to enable automation of one or more aspects of a factoring action of one or more terms and conditions of a factoring transaction, such as based on a set of conditions, which may include smart contract 3431 terms and conditions, marketplace conditions (of platform marketplaces and/or external marketplaces 3390, conditions monitored by monitoring system layers 3306 and data collection systems 3318, and the like (such as of entities 3330, including without limitation parties 4910, collateral 4802 and assets 4918, accounts receivable, and inventory, among others). For example, a user of the factoring solution 4942 may create, configure (such as using one or more templates or libraries), modify, set or otherwise handle (such as in a user interface of the factoring solution 4942 and/or RPA system 3442) various rules, thresholds, conditional procedures, workflows, model parameters, and the like that determine, or recommend, a factoring action or plan for a factoring transaction or monitoring solution based on one or more events, conditions, states, actions, or the like, where the factoring plan may be based on various factors, such as the status of receivables, the status of work-in-progress, the status of inventory, the status of delivery and/or shipment, the status of payments, the status of the borrower, the status of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 used to secure or back a loan, state of a business or business operation (e.g., receivables, payables, or the like), conditions of parties 4910 (such as net worth, wealth, debt, location, and other conditions), behaviors of parties (such as behaviors indicating preferences, behaviors indicating negotiation styles, and the like), and many others. Factoring may include factoring with respect to loans, communications to encourage payments, and the like. In embodiments, the factoring solution 4942 may automatically recommend or set rules, thresholds, actions, parameters, and the like (optionally by learning to do so based on a training set of outcomes over time), resulting in a recommended factoring plan, which may specify a series of actions required to accomplish a recommended or desired outcome of factoring (such as within a range of acceptable outcomes), which may be automated and may involve conditional execution of steps based on monitored conditions and/or smart contract terms, which may be created, configured, and/or accounted for by the factoring plan. Factoring plans may be determined and executed based at least one part on market factors (such as competing interest rates or other terms and conditions offered by other lenders, values of collateral, values of accounts receivable, interest rates, and the like), as well as regulatory and/or compliance factors. Factoring plans may be generated and/or executed for creation of new factoring arrangements, for modifications of existing factoring arrangements, and others. In embodiments, adaptive intelligent systems layers 3304, including artificial intelligence 3448, may be trained on a training set of factoring activities by experts and/or on outcomes of factoring actions to generate a set of predictions, classifications, control instructions, plans, models, or the like for automated creation, management and/or execution of one or more aspects of a factoring plan.

In embodiments, provided herein is a robotic process automation system for consolidating a set of loans. An example platform or system includes (a) a set of data collection and monitoring services for collecting information about entities involved in a set of factoring loans and for collecting a training set of interactions between entities for a set of factoring loan transactions; (b) an artificial intelligence system that is trained on the training set of interactions to classify the entities involved in the set of factoring loans; and (c) a robotic process automation system that is trained on the set of factoring loan interactions to manage a factoring loan. Certain further aspects of an example system are described following, any one or more of which may be present in certain embodiments.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities, and a set of crowdsourcing services configured to solicit and report information related to the entities.

Figure 61:
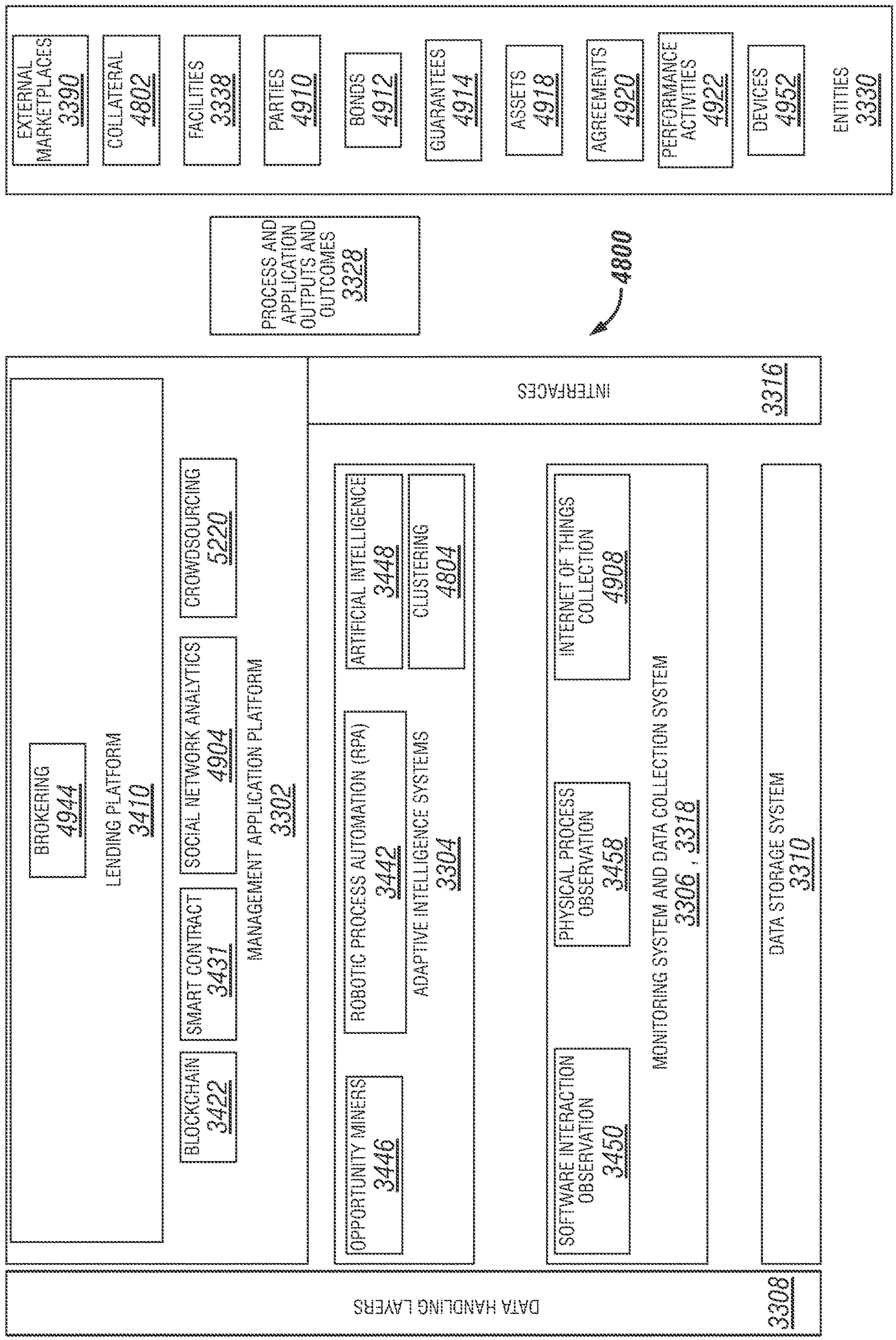
FIG. 61 depicts components and interactions of a lending platform having a robotic process automation system for brokering a mortgage loan.

An RPA Mortgage Loan Broker Trained on a Training Set of Expert Broker Interactions with Borrowers Referring to FIG. 61, in embodiments, a lending platform is provided having a robotic process automation system for brokering a loan. The loan may be, for example, a mortgage loan.

The RPA system 3442 may provide automation for one or more aspects of a brokering solution 4944 that enables automated brokering and/or provides a recommendation or plan for a brokering activity relevant to a lending transaction, such as for brokering a set of mortgage loans, home loans, lines of credit, automobile loans, construction loans, or other loans of any of the types described herein. The brokering solution 4944 and/or RPA system 3442 for brokering may include a set of interfaces, workflows, and models (which may include, use or be enabled by various adaptive intelligent systems layers 3304) and other components that are configured to enable automation of one or more aspects of a brokering action or a brokering process for a lending transaction, such as based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, as well as of interest rates, available lenders, available terms and the like). For example, a user of the brokering solution 4944 may create, configure (such as using one or more templates or libraries), modify, set or otherwise handle (such as in a user interface of the brokering solution 4944 and/or RPA system 3442) various rules, thresholds, conditional procedures, workflows, model parameters, and the like that determine, or recommend, a brokering action or plan for brokering a set of loans of a given type or types based on one or more events, conditions, states, actions, or the like, where the brokering plan may be based on various factors, such as the interest rates of the set of loans available from various primary and secondary lenders, permitted attributes of borrowers (e.g., based on income, wealth, location, or the like), prevailing interest rates in a platform marketplace or external marketplace, the status of the borrowers of a set of loans, the status or other attributes of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences), and many others. Brokering may include brokering with respect to terms and conditions of sets of loans, selection of appropriate loans, configuration of payment terms for consolidated loans, configuration of payoff plans for pre-existing loans, communications to encourage borrowing, and the like. In embodiments, the brokering solution 4944 may automatically recommend or set rules, thresholds, actions, parameters, and the like (optionally by learning to do so based on a training set of outcomes over time), resulting in a recommended brokering plan, which may specify a series of actions required to accomplish a recommended or desired outcome of brokering (such as within a range of acceptable outcomes), which may be automated and may involve conditional execution of steps based on monitored conditions and/or smart contract terms, which may be created, configured, and/or accounted for by the brokering plan. Brokering plans may be determined and executed based at least one part on market factors (such as competing interest rates offered by other lenders, property values, attributes of borrowers, values of collateral, and the like), as well as regulatory and/or compliance factors. Brokering plans may be generated and/or executed for creation of new loans, for secondary loans, for modifications of existing loans, for refinancing terms, for situations involving market changes (e.g., changes in prevailing interest rates or property values), and others. In embodiments, adaptive intelligent systems layers 3304, including artificial intelligence 3448, may be trained on a training set of brokering activities by experts and/or on outcomes of brokering actions to generate a set of predictions, classifications, control instructions, plans, models, or the like for automated creation, management and/or execution of one or more aspects of a brokering plan.

In embodiments, provided herein is a robotic process automation system for automating brokering of a mortgage. An example platform or system includes (a) a set of data collection and monitoring services for collecting information about entities involved in a set of mortgage loan activities and for collecting a training set of interactions between entities for a set of mortgage loan transactions; (b) an artificial intelligence system that is trained on the training set of interactions to classify the entities involved in the set of mortgage loans; and (c) a robotic process automation system that is trained on at least one of the set of mortgage loan activities and the set of mortgage loan interactions to broker a mortgage loan. Certain further aspects of an example system are described following, any one or more of which may be present in certain embodiments.

An example system includes where at least one of the set of mortgage loan activities and the set of mortgage loan interactions includes activities among marketing activity, identification of a set of prospective borrowers, identification of property, identification of collateral, qualification of borrower, title search, title verification, property assessment, property inspection, property valuation, income verification, borrower demographic analysis, identification of capital providers, determination of available interest rates, determination of available payment terms and conditions, analysis of existing mortgage, comparative analysis of existing and new mortgage terms, completion of application workflow, population of fields of application, preparation of mortgage agreement, completion of schedule to mortgage agreement, negotiation of mortgage terms and conditions with capital provider, negotiation of mortgage terms and conditions with borrower, transfer of title, placement of lien, and closing of mortgage agreement.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities, and a set of crowdsourcing services configured to solicit and report information related to the entities.

An example system includes where the artificial intelligence system uses a model that processes attributes of entities involved in the set of mortgage loans, wherein the attributes are selected from properties that are subject to mortgages, assets used for collateral, identity of a party, interest rate, payment balance, payment terms, payment schedule, type of mortgage, type of property, financial condition of party, payment status, condition of property, and value of property.

An example system includes where managing a mortgage loan includes managing at least one of a property that is subject to a mortgage, identification of candidate mortgages from a set of borrower situations, preparation of a mortgage offer, preparation of content communicating a mortgage offer, scheduling a mortgage offer, communicating a mortgage offer, negotiating a modification of a mortgage offer, preparing a mortgage agreement, executing a mortgage agreement, modifying collateral for a set of mortgage loans, handing transfer of a lien, handling an application workflow, managing an inspection, managing an assessment of a set of assets to be subject to a mortgage, setting an interest rate, deferring a payment requirement, setting a payment schedule, and closing a mortgage agreement. An example system includes where the entities are a set of parties to a loan transaction. An example system includes where the set of parties is selected from among a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, and an accountant.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system includes where the robotic process automation is trained on a set of interactions of parties with a set of user interfaces involved in a set of mortgage-related activities. An example system includes where upon completion of negotiation a smart contract for a mortgage loan is automatically configured by a set of smart contract services based on the outcome of the negotiation. An example system includes where at least one of an outcome and a negotiating event of the negotiation is recorded in a distributed ledger associated with the loan. An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

Figure 62:
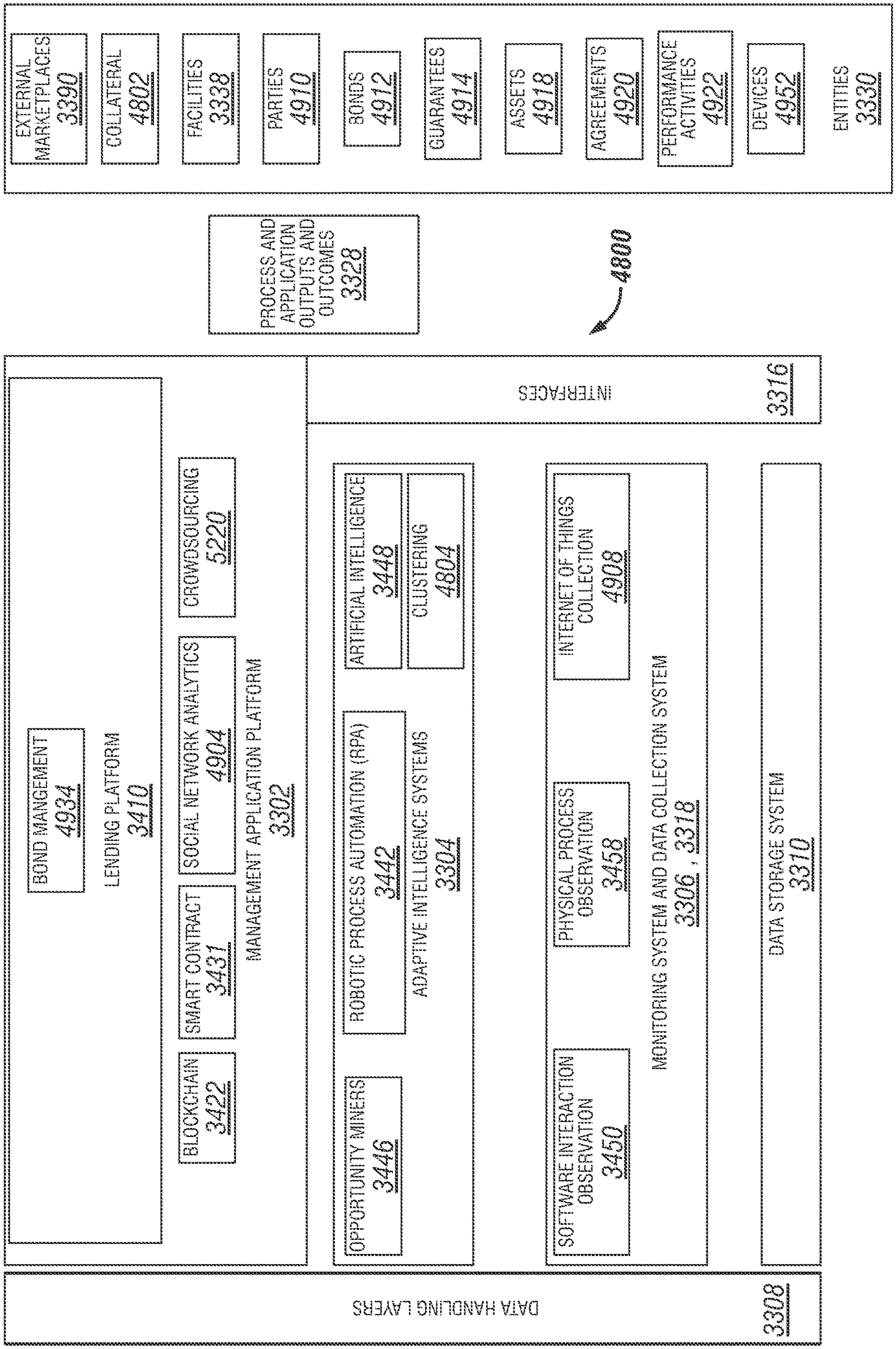
FIG. 62 depicts components and interactions of a lending platform having a crowdsourcing and automated classification system for validating condition of an issuer for a bond, a social network monitoring system with artificial intelligence for classifying a condition about a bond, and an Internet of Things data collection and monitoring system with artificial intelligence for classifying a condition about a bond.

Crowdsourcing and Automated Classification System for Validating Condition of an Issuer for a Bond Referring to FIG. 62, in embodiments, a lending platform is provided having a crowdsourcing and automated classification system for validating condition of an issuer for a bond. The RPA system 3442 may provide automation for one or more aspects of a bond management solution 4934 that enables automated bond management and/or provides a recommendation or plan for a bond management activity relevant to a bond transaction, such as for municipal bonds, corporate bonds, government bonds, or other bonds that may be backed by assets, collateral, or commitments of a bond issuer. The bond management solution 4934 and/or RPA system 3442 for bond management may include a set of interfaces, workflows, and models (which may include, use or be enabled by various adaptive intelligent systems layers 3304) and other components that are configured to enable automation of one or more aspects of a bond management action or a management process for a bond transaction, such as based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, as well as of interest rates, available lenders, available terms and the like). For example, a user of the bond management solution 4934 may create, configure (such as using one or more templates or libraries), modify, set or otherwise handle (such as in a user interface of the bond management solution 4934 and/or RPA system 3442) various rules, thresholds, conditional procedures, workflows, model parameters, and the like that determine, or recommend, a bond management action or plan for management a set of bonds of a given type or types based on one or more events, conditions, states, actions, or the like, where the bond management plan may be based on various factors, such as the interest rates available from various primary and secondary lenders or issuers, permitted attributes of issuers and buyers (e.g., based on income, wealth, location, or the like) prevailing interest rates in a platform marketplace or external marketplace, the status of the issuers of a set of bonds, the status or other attributes of collateral 4802 or assets 4918, risk factors of the issuer, one or more guarantors, market risk factors and the like (including predicted risk based on one or more predictive models using artificial intelligence 3448), status of debt, condition of collateral 4802 or assets 4918 available to secure or back a set of bonds, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences), and many others. Bond management may include management with respect to terms and conditions of sets of bonds, selection of appropriate bonds, communications to encourage transactions, and the like. In embodiments, the bond management solution 4934 may automatically recommend or set rules, thresholds, actions, parameters, and the like (optionally by learning to do so based on a training set of outcomes over time), resulting in a recommended bond management plan, which may specify a series of actions required to accomplish a recommended or desired outcome of bond management (such as within a range of acceptable outcomes), which may be automated and may involve conditional execution of steps based on monitored conditions and/or smart contract terms, which may be created, configured, and/or accounted for by the bond management plan. Bond management plans may be determined and executed based at least one part on market factors (such as competing interest rates offered by other issuers, property values, attributes of issuers, values of collateral or assets, and the like), as well as regulatory and/or compliance factors. Bond management plans may be generated and/or executed for creation of new bonds, for secondary loans or transactions to back bonds, for modifications of existing bonds, for situations involving market changes (e.g., changes in prevailing interest rates or property values), and others. In embodiments, adaptive intelligent systems layers 3304, including artificial intelligence 3448, may be trained on a training set of bond management activities by experts and/or on outcomes of bond management actions to generate a set of predictions, classifications, control instructions, plans, models, or the like for automated creation, management and/or execution of one or more aspects of a bond management plan.

Figure 63:
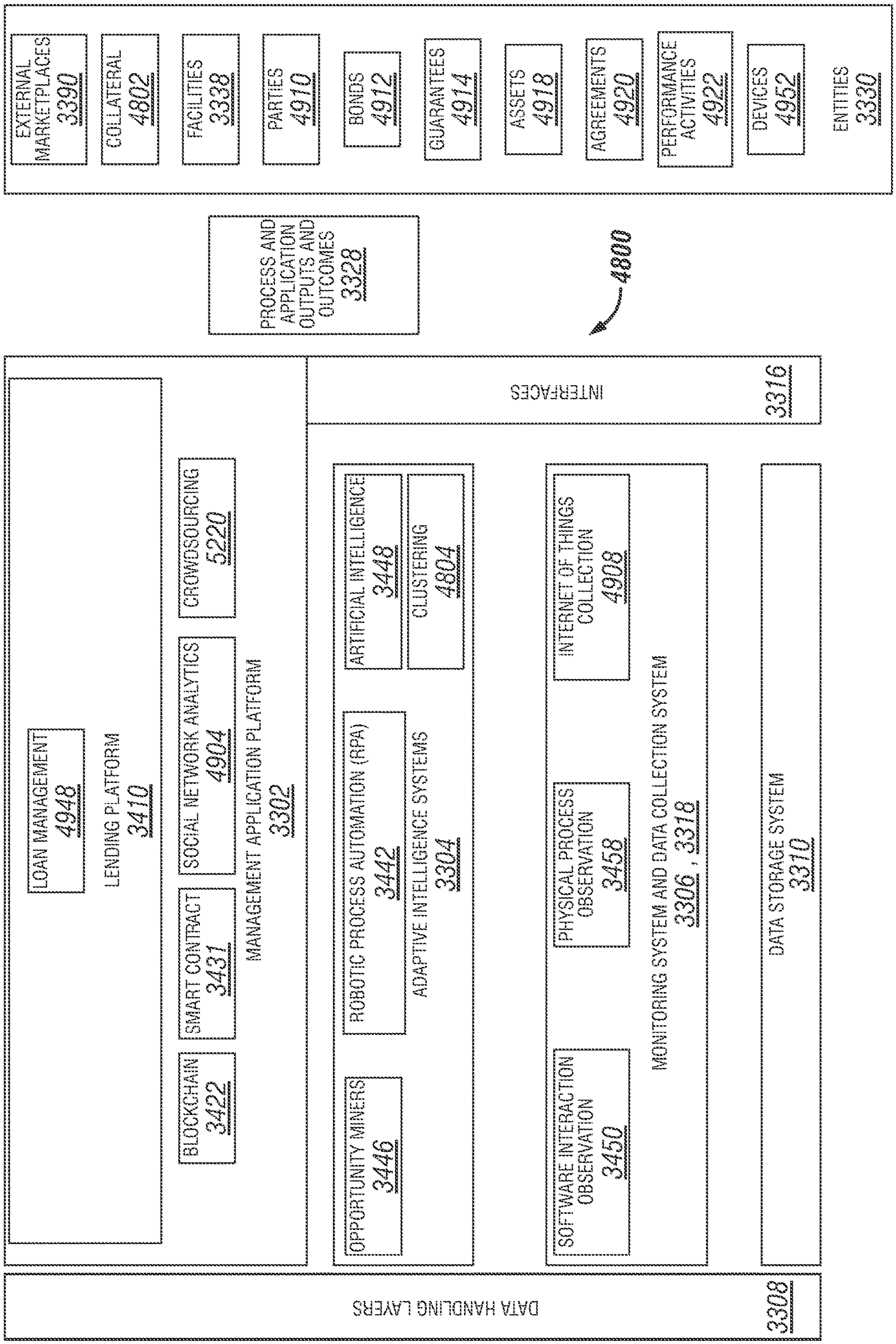
FIG. 63 depicts components and interactions of a lending platform having a system that manages the terms and conditions of a loan based on a parameter monitored by the IoT, by a parameter determined by a social network analytic system, or a parameter determined by a crowdsourcing system.

Systems that Varies the Interest Rate or Other Terms on a Subsidized Loan Based on a Parameter Monitored by the IoT Referring to FIG. 63, in embodiments, a lending platform is provided having a system that varies the terms and conditions of a loan based on a parameter monitored by the IoT. The loan may be a subsidized loan. The RPA system 3442 may provide automation for one or more aspects of a loan management solution 4948 that enables automated loan management and/or provides a recommendation or plan for a loan management activity relevant to a loan transaction, such as for personal loans, corporate loans, subsidized loans, student loans, or other loans, including ones that may be backed by assets, collateral, or commitments of a borrower. The loan management solution 4948 and/or RPA system 3442 for loan management may include a set of interfaces, workflows, and models (which may include, use or be enabled by various adaptive intelligent systems layers 3304) and other components that are configured to enable automation of one or more aspects of a loan management action or a management process for a loan transaction, such as based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, as well as of interest rates, available lenders, available terms and the like). For example, a user of the loan management solution 4948 may create, configure (such as using one or more templates or libraries), modify, set or otherwise handle (such as in a user interface of the loan management solution 4948 and/or RPA system 3442) various rules, thresholds, conditional procedures, workflows, model parameters, and the like that determine, or recommend, a loan management action or plan for management a set of loans of a given type or types based on one or more events, conditions, states, actions, or the like, where the loan management plan may be based on various factors, such as the interest rates available from various primary and secondary lenders or issuers, permitted attributes of borrowers (e.g., based on income, wealth, location, or the like), prevailing interest rates in a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Loan management may include management with respect to terms and conditions of sets of loans, selection of appropriate loans, communications to encourage transactions, and the like. In embodiments, the loan management solution 4948 may automatically recommend or set rules, thresholds, actions, parameters, and the like (optionally by learning to do so based on a training set of outcomes over time), resulting in a recommended loan management plan, which may specify a series of actions required to accomplish a recommended or desired outcome of loan management (such as within a range of acceptable outcomes), which may be automated and may involve conditional execution of steps based on monitored conditions and/or smart contract terms, which may be created, configured, and/or accounted for by the loan management plan. Loan management plans may be determined and executed based at least one part on market factors (such as competing interest rates offered by other issuers, property values, attributes of issuers, values of collateral or assets, and the like), as well as regulatory and/or compliance factors. Loan management plans may be generated and/or executed for creation of new loans, for secondary loans or transactions to back loans, for collection, for consolidation, for foreclosure, for situations of bankruptcy or insolvency, for modifications of existing loans, for situations involving market changes (e.g., changes in prevailing interest rates or property values), and others. In embodiments, adaptive intelligent systems layers 3304, including artificial intelligence 3448, may be trained on a training set of loan management activities by experts and/or on outcomes of loan management actions to generate a set of predictions, classifications, control instructions, plans, models, or the like for automated creation, management and/or execution of one or more aspects of a loan management plan.

Automated Blockchain Custody Service

Figure 64:
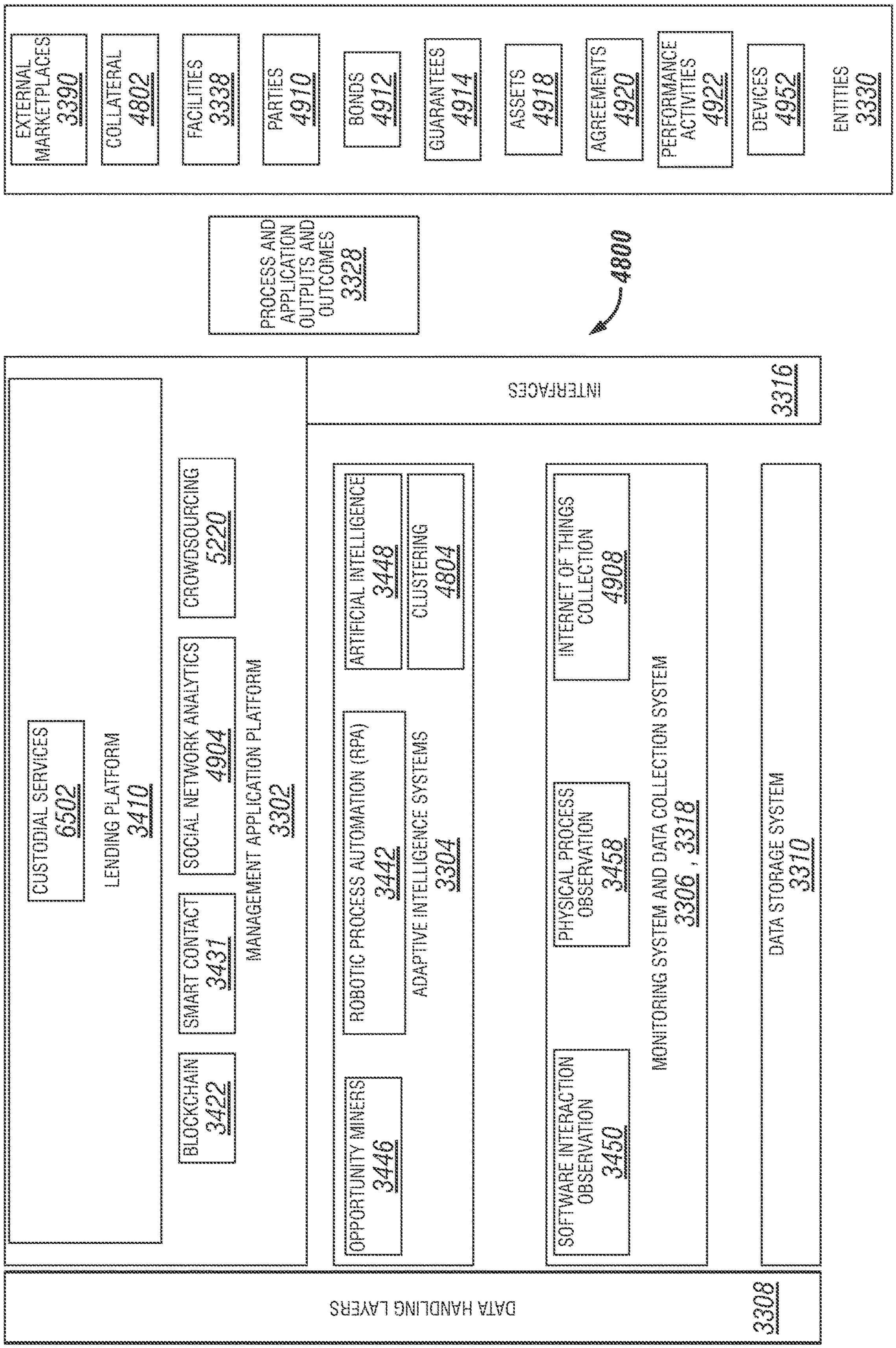
FIG. 64 depicts components and interactions of a lending platform having an automated blockchain custody service for managing a set of custodial assets.

Referring to FIG. 64, in embodiments, a lending platform is provided having an automated blockchain custody service and solution for managing a set of custodial assets. The RPA system 3442 may provide automation for one or more aspects of a custodial solution 6502 that enables automated custodial management and/or provides a recommendation or plan for a custodial activity relevant to a set of assets, such as ones involved in or backing a lending transaction or ones for which clients seek custodial for security or administrative purposes, such as for assets of any of the types described herein, including cryptocurrencies and other currencies, stock certificates and other evidence of ownership, securities, and many others. The custodial solution 6502 and/or RPA system 3442 for handling custodial activity may include a set of interfaces, workflows, and models (which may include, use or be enabled by various adaptive intelligent systems layers 3304) and other components that are configured to enable automation of one or more aspects of a custodial action or a management process for trust or custody of a set of assets 4918, such as based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, and the like). For example, a user of the custodial solution 6502 may create, configure (such as using one or more templates or libraries), modify, set or otherwise handle (such as in a user interface of the custodial solution 6502 and/or RPA system 3442) various rules, thresholds, conditional procedures, workflows, model parameters, and the like that determine, or recommend, a custodial action or plan for management a set of assets of a given type or types based on one or more events, conditions, states, actions, status or the like, where the custodial plan may be based on various factors, such as the storage options available, the basis for retrieval of assets, the basis for transfer of ownership of assets, and the like, condition of assets 4918 for which custodial services will be required, behaviors of parties (such as behaviors indicating preferences), and many others. Custodial services may include management with respect to terms and conditions of sets of assets, selection of appropriate terms and conditions for trust and custody, selection of parameters for transfer of ownership, selection and provision of storage, selection and provision of secure infrastructure for data storage, and others. In embodiments, the custodial solution 48802 may automatically recommend or set rules, thresholds, actions, parameters, and the like (optionally by learning to do so based on a training set of outcomes over time), resulting in a recommended custodial plan, which may specify a series of actions required to accomplish a recommended or desired outcome of custodial services (such as within a range of acceptable outcomes), which may be automated and may involve conditional execution of steps based on monitored conditions and/or smart contract terms, which may be created, configured, and/or accounted for by the custodial plan. Custodial plans may be determined and executed based at least one part on market factors (such as competing terms and conditions offered by other custodians, property values, attributes of clients, values of collateral or assets, costs of physical storage, costs of data storage, and the like), as well as regulatory and/or compliance factors. In embodiments, adaptive intelligent systems layers 3304, including artificial intelligence 3448, may be trained on a training set of custodial activities by experts and/or on outcomes of custodial actions to generate a set of predictions, classifications, control instructions, plans, models, or the like for automated creation, management and/or execution of one or more aspects of a custodial plan. In embodiments, actions with respect to custody of a set of assets may be stored in a blockchain 3422, such as in a distributed ledger.

In embodiments, provided herein is a system for handling trust and custody for a set of assets. An example platform or system for handling trust and custody for a set of assets may include (a) a set of asset identification services for identifying a set of assets for which a financial institution is responsible for taking custody; and (b) a set of identity management services by which the financial institution verifies identities and credentials of a set of entities entitled to take action with respect to the assets and a set of blockchain services, wherein at least one of the set of assets and identifying information for the set of assets is stored in a blockchain and wherein events related to the set of assets are recorded in a distributed ledger. Certain further aspects of an example system are described following, any one or more of which may be present in certain embodiments.

An example system includes where the credentials include owner credentials, agent credentials, beneficiary credentials, trustee credentials, and custodian credentials.

In embodiments, the events related to the set of assets include transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, and designation of an ownership status.

In embodiments, the platform or system further includes a set of data collection and monitoring services for monitoring at least one of the set of assets, a set of entities, and a set of events related to the assets.

In embodiments, the set of entities includes at least one of an owner, a beneficiary, an agent, a trustee, and a custodian.

In embodiments, the platform or system further includes a set of smart contract services for managing the custody of the set of assets, wherein at least one event related to the set of assets is managed automatically by the smart contract based on a set of terms and conditions embodied in the smart contract and based on information collected by the set of data collection and monitoring services.

In embodiments, the events related to the set of assets include transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, and designation of an ownership status.

Figure 65:
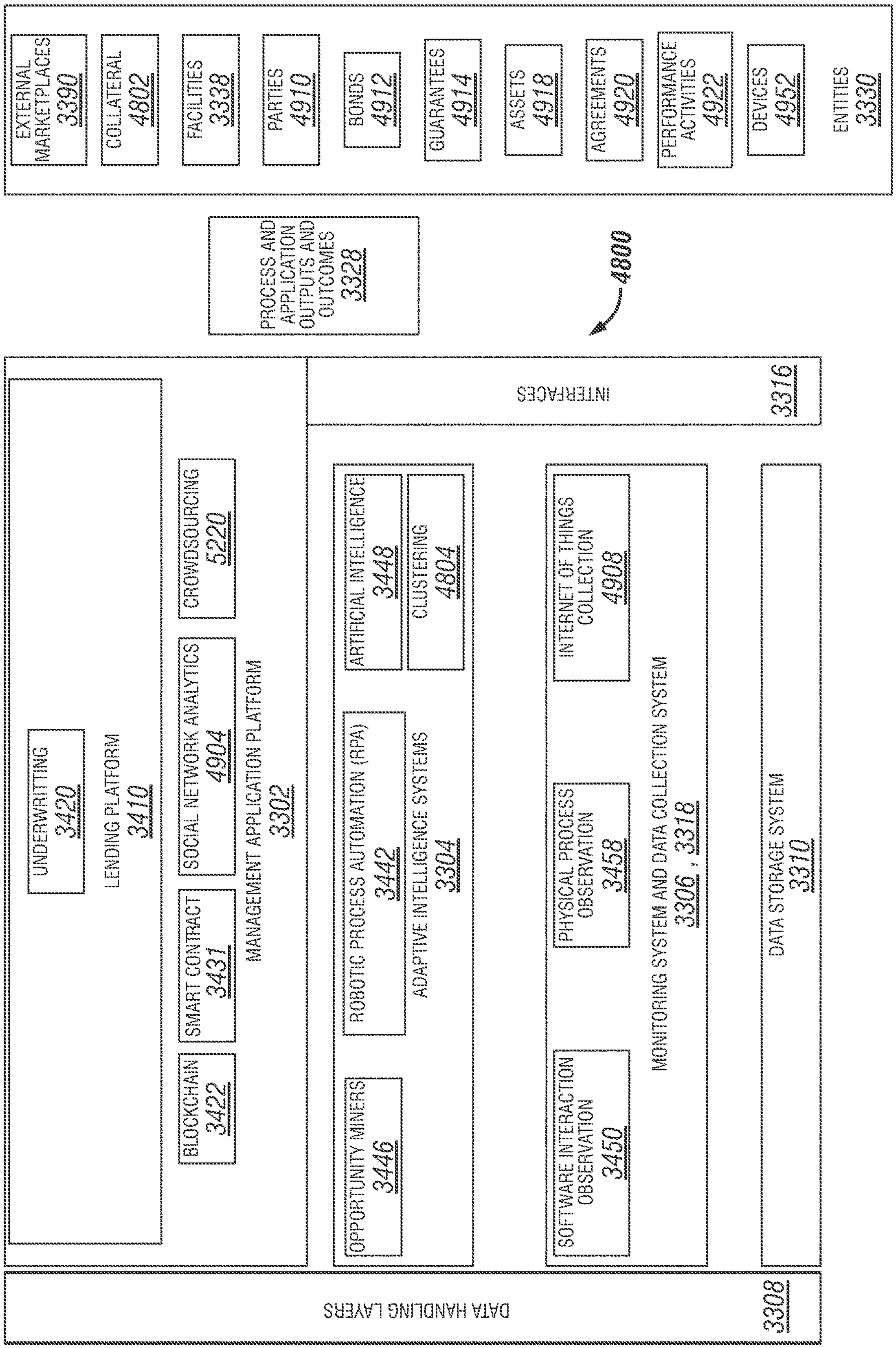
FIG. 65 depicts components and interactions of a lending platform having an underwriting system for a loan with a set of data-integrated microservices including data collection and monitoring services, blockchain services, artificial intelligence services, and smart contract services for underwriting lending entities and transactions.

Referring to FIG. 65, in embodiments, a lending platform is provided having an underwriting system for a loan with a set of data-integrated microservices including data collection and monitoring services, blockchain services, artificial intelligence services, and smart contract services for underwriting lending entities and transactions. The RPA system 3442 may provide automation for one or more aspects of an underwriting solution 3420 that enables automated underwriting and/or provides a recommendation or plan for an underwriting activity relevant to a loan transaction, such as for personal loans, corporate loans, subsidized loans, student loans, or other loans, including ones that may be backed by assets, collateral, or commitments of a borrower. The underwriting solution 3420 and/or RPA system 3442 for underwriting may include a set of interfaces, workflows, and models (which may include, use or be enabled by various adaptive intelligent systems layers 3304) and other components that are configured to enable automation of one or more aspects of a underwriting action or a management process for a loan transaction, such as based on a set of conditions, which may include smart contract 3431 terms and conditions, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, as well as of interest rates, available lenders, available terms, and the like). For example, a user of the underwriting solution 3420 may create, configure (such as using one or more templates or libraries), modify, set or otherwise handle (such as in a user interface of the underwriting solution 3420 and/or RPA system 3442) various rules, thresholds, conditional procedures, workflows, model parameters, and the like that determine, or recommend, a underwriting action or plan for management a set of loans of a given type or types based on one or more events, conditions, states, actions, or the like, where the underwriting plan may be based on various factors, such as the interest rates available from various primary and secondary lenders or issuers, permitted attributes of borrowers (e.g., based on income, wealth, location, or the like), prevailing interest rates in a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Underwriting may include management with respect to terms and conditions of sets of loans, selection of appropriate loans, communications relevant to underwriting processes, and the like. In embodiments, the underwriting solution 3420 may automatically recommend or set rules, thresholds, actions, parameters, and the like (optionally by learning to do so based on a training set of outcomes over time), resulting in a recommended underwriting plan, which may specify a series of actions required to accomplish a recommended or desired outcome of underwriting (such as within a range of acceptable outcomes), which may be automated and may involve conditional execution of steps based on monitored conditions and/or smart contract terms, which may be created, configured, and/or accounted for by the underwriting plan. Underwriting plans may be determined and executed based at least one part on market factors (such as competing interest rates offered by other issuers, property values, borrower behavior, demographic trends, payment trends, attributes of issuers, values of collateral or assets, and the like), as well as regulatory and/or compliance factors. Underwriting plans may be generated and/or executed for new loans, for secondary loans or transactions to back loans, for collection, for consolidation, for foreclosure, for situations of bankruptcy or insolvency, for modifications of existing loans, for situations involving market changes (e.g., changes in prevailing interest rates or property values), for foreclosure activities, and others. In embodiments, adaptive intelligent systems layers 3304, including artificial intelligence 3448, may be trained on a training set of underwriting activities by experts and/or on outcomes of underwriting actions to generate a set of predictions, classifications, control instructions, plans, models, or the like for automated creation, management and/or execution of one or more aspects of an underwriting plan. In embodiments, events and outcomes of underwriting may be recorded in a blockchain 3422, such as in a distributed ledger, for secure access and retrieval by authorized users. Adaptive intelligent systems layers 3304 may, such as using various artificial intelligence 3448 or expert systems disclosed herein and in the documented incorporated by reference herein, improve or automate one or more aspects of underwriting, such as by training a model, a neural net, a deep learning system, or the like based on a training set of expert interactions and/or a training set of outcomes from underwriting activities.

Figure 66:
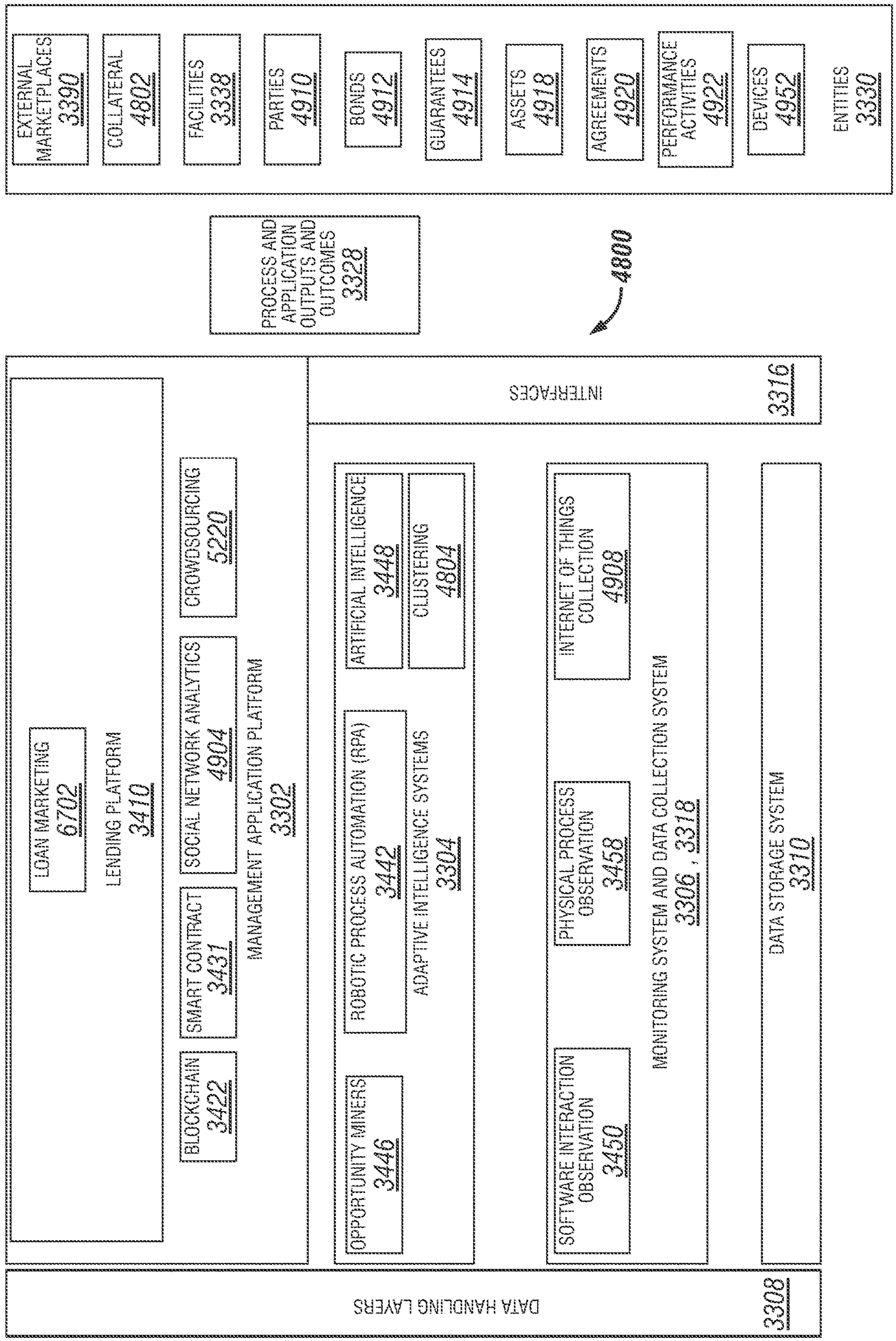
FIG. 66 depicts components and interactions of a lending platform having a loan marketing system with a set of data-integrated microservices including data collection and monitoring services, blockchain services, artificial intelligence services and smart contract services for marketing a loan to a set of prospective parties.

Referring to FIG. 66, in embodiments, a lending platform is provided having a loan marketing system with a set of data-integrated microservices including data collection and monitoring services, blockchain services, artificial intelligence services, and smart contract services for marketing a loan to a set of prospective parties. The system 4800 may enable one or more aspects of a loan marketing solution 6702 that enables automated loan marketing and/or provides a recommendation or plan for a loan marketing activity relevant to a loan transaction, such as for personal loans, corporate loans, subsidized loans, student loans, or other loans, including ones that may be backed by assets, collateral, or commitments of a borrower. The loan marketing solution 6702 (which in embodiments may include or use an RPA system 3442 configured for loan marketing) may include a set of interfaces, workflows, and models (which may include, use or be enabled by various adaptive intelligent systems layers 3304) and other components that are configured to enable automation of one or more aspects of a loan marketing action or a management process for a loan transaction, such as based on a set of conditions, which may include smart contract 3431 terms and conditions (which may be configured, e.g., for a marketed set of loans), available capital for lending, regulatory factors, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, as well as of interest rates, available lenders, available terms and the like), and others. For example, a user of the loan marketing solution 6702 may create, configure (such as using one or more templates or libraries), modify, set or otherwise handle (such as in a user interface of the loan marketing solution 6702 and/or RPA system 3442) various rules, thresholds, conditional procedures, workflows, model parameters, and the like that determine, or recommend, a loan marketing action or plan for management a set of loans of a given type or types based on one or more events, conditions, states, actions, or the like, where the loan marketing plan may be based on various factors, such as the interest rates available from various primary and secondary lenders or issuers, returns on the capital that is made available for loans, permitted or desired attributes of borrowers (e.g., based on income, wealth, location, or the like), prevailing interest rates in a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Loan marketing may include management with respect to terms and conditions of sets of loans, selection of appropriate loans, communications relevant to loan marketing processes, and the like. In embodiments, the loan marketing solution 6702 may automatically recommend or set rules, thresholds, actions, parameters, and the like (optionally by learning to do so based on a training set of outcomes over time), resulting in a recommended loan marketing plan, which may specify a series of actions required to accomplish a recommended or desired outcome of loan marketing (such as within a range of acceptable outcomes), which may be automated and may involve conditional execution of steps based on monitored conditions and/or smart contract terms, which may be created, configured, and/or accounted for by the loan marketing plan. Loan marketing plans may be determined and executed based at least one part on market factors (such as competing interest rates offered by other issuers, property values, borrower behavior, demographic trends, payment trends, attributes of issuers, values of collateral or assets, and the like), as well as regulatory and/or compliance factors. Loan marketing plans may be generated and/or executed for new loans, for secondary loans or transactions to back loans, for collection, for consolidation, for foreclosure situations (e.g., as an alternative to foreclosure), for situations of bankruptcy or insolvency, for modifications of existing loans, for situations involving market changes (e.g., changes in prevailing interest rates, available capital, or property values), and others. In embodiments, adaptive intelligent systems layers 3304, including artificial intelligence 3448, may be trained on a training set of loan marketing activities by experts and/or on outcomes of loan marketing actions to generate a set of predictions, classifications, control instructions, plans, models, or the like for automated creation, management and/or execution of one or more aspects of a loan marketing plan. In embodiments, events and outcomes of loan marketing may be recorded in a blockchain 3422, such as in a distributed ledger, for secure access and retrieval by authorized users. Adaptive intelligent systems layers 3304 may, such as using various artificial intelligence 3448 or expert systems disclosed herein and in the documented incorporated by reference herein, improve or automate one or more aspects of entity rating, such as by training a model, a neural net, a deep learning system, or the like based on a training set of expert interactions and/or a training set of outcomes from loan marketing activities.

Figure 67:
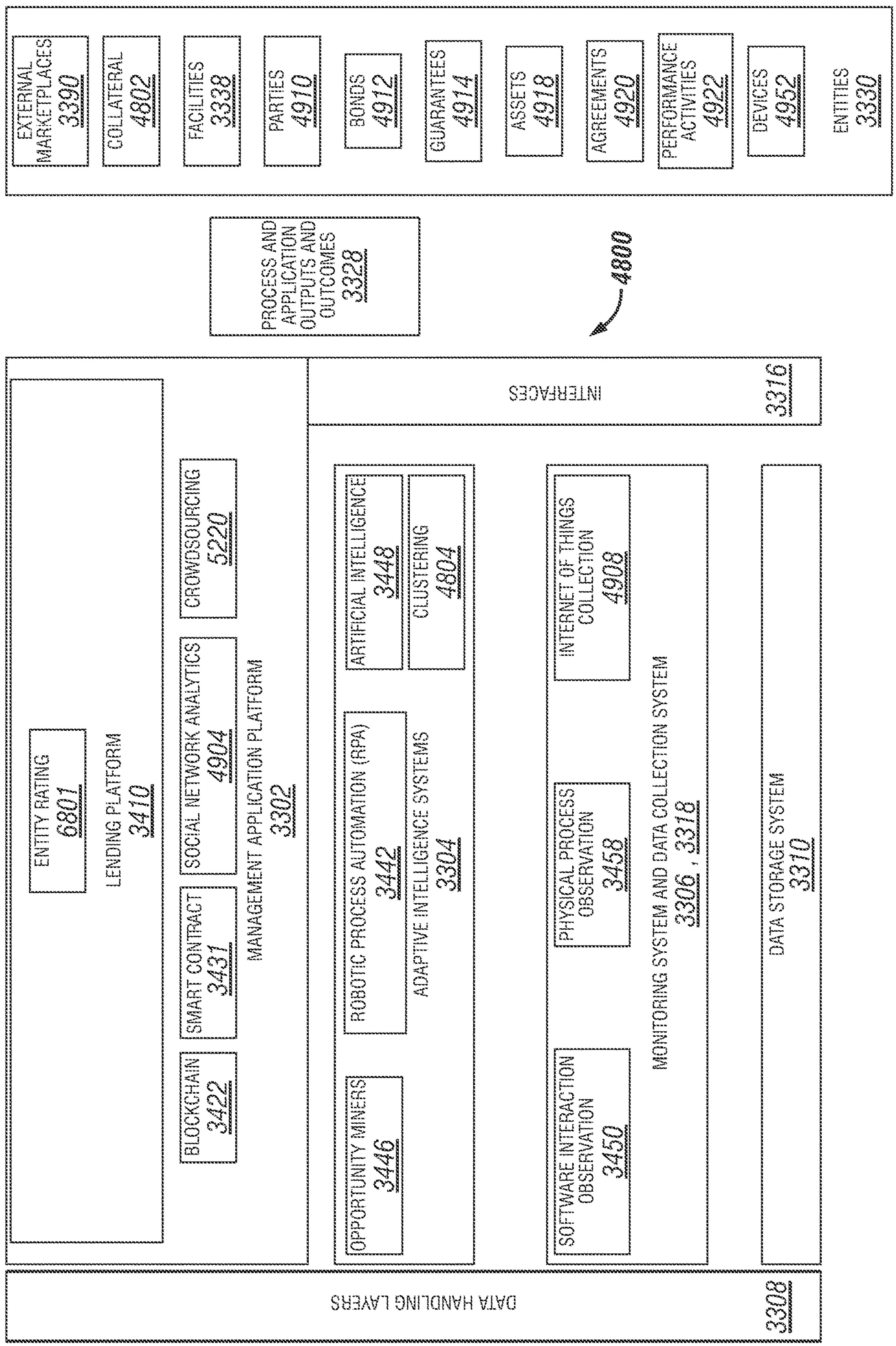
FIG. 67 depicts components and interactions of a lending platform having a rating system with a set of data-integrated microservices including data collection and monitoring services, blockchain services, artificial intelligence services, and smart contract services for rating a set of loan-related entities.

Referring to FIG. 67, in embodiments, a lending platform is provided having a rating system with a set of data-integrated microservices including data collection and monitoring services, blockchain services, artificial intelligence services, and smart contract services for rating a set of loan-related entities. The system 4800 may enable one or more aspects of an entity rating solution 6801 that enables automated entity rating and/or provides a recommendation or plan for an entity rating activity relevant to a loan transaction, such as for personal loans, corporate loans, subsidized loans, student loans, or other loans, including ones that may be backed by assets, collateral, or commitments of a borrower. The entity rating solution 6801 (which in embodiments may include or use an RPA system 3442 configured for entity rating) may include a set of interfaces, workflows, and models (which may include, use or be enabled by various adaptive intelligent systems layers 3304) and other components that are configured to enable automation of one or more aspects of an entity rating action or a rating process for a loan transaction, such as based on a set of conditions, attributes, events, or the like, which may include attributes of entities 3330 (such as value, quality, location, net worth, price, physical condition, health condition, security, safety, ownership and the like), smart contract 3431 terms and conditions (which may be configured or populated, e.g., based on ratings for a rated set of loans), regulatory factors, marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, as well as of interest rates, available lenders, available terms and the like), and others. For example, a user of the entity rating solution 4901 may create, configure (such as using one or more templates or libraries), modify, set or otherwise handle (such as in a user interface of the entity rating solution 6801 and/or RPA system 3442) various rules, thresholds, conditional procedures, workflows, model parameters, and the like that determine, or recommend, an entity rating action or plan for rating a set of loans of a given type or types based on one or more events, attributes, parameters, characteristics, conditions, states, actions, or the like, where the entity rating plan may be based on various factors (e.g., based on income, wealth, location, or the like or parties 4910, relative to others, or based on condition of collateral 4802 or assets 4918, or the like), prevailing conditions of a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Entity rating may include management with respect to terms and conditions of sets of loans, selection of appropriate loans, communications relevant to entity rating processes, and the like. In embodiments, the entity rating solution 6801 may automatically recommend or set rules, thresholds, actions, parameters, and the like (optionally by learning to do so based on a training set of outcomes over time), resulting in a recommended entity rating plan, which may specify a series of actions required to accomplish a recommended or desired outcome of entity rating (such as within a range of acceptable outcomes), which may be automated and may involve conditional execution of steps based on monitored conditions and/or smart contract terms, which may be created, configured, and/or accounted for by the entity rating plan. Entity rating plans may be determined and executed based at least one part on market factors (such as competing interest rates offered by other issuers, property values, borrower behavior, demographic trends, payment trends, attributes of issuers, values of collateral or assets, and the like), as well as regulatory and/or compliance factors. Entity rating plans may be generated and/or executed for new loans, for secondary loans or transactions to back loans, for collection, for consolidation, for foreclosure situations (e.g., as an alternative to foreclosure), for situations of bankruptcy or insolvency, for modifications of existing loans, for situations involving market changes (e.g., changes in prevailing interest rates, available capital, or property values), and others. In embodiments, adaptive intelligent systems layers 3304, including artificial intelligence 3448, may be trained on a training set of entity rating activities by experts and/or on outcomes of entity rating actions to generate a set of predictions, classifications, control instructions, plans, models, or the like for automated creation, management, and/or execution of one or more aspects of an entity rating plan. In embodiments, events and outcomes of entity rating may be recorded in a blockchain 3422, such as in a distributed ledger, for secure access and retrieval by authorized users. Adaptive intelligent systems layers 3304 may, such as using various artificial intelligence 3448 or expert systems disclosed herein and in the documented incorporated by reference herein, improve or automate one or more aspects of entity rating, such as by training a model, a neural net, a deep learning system, or the like based on a training set of expert interactions and/or a training set of outcomes from entity rating activities.

Figure 68:
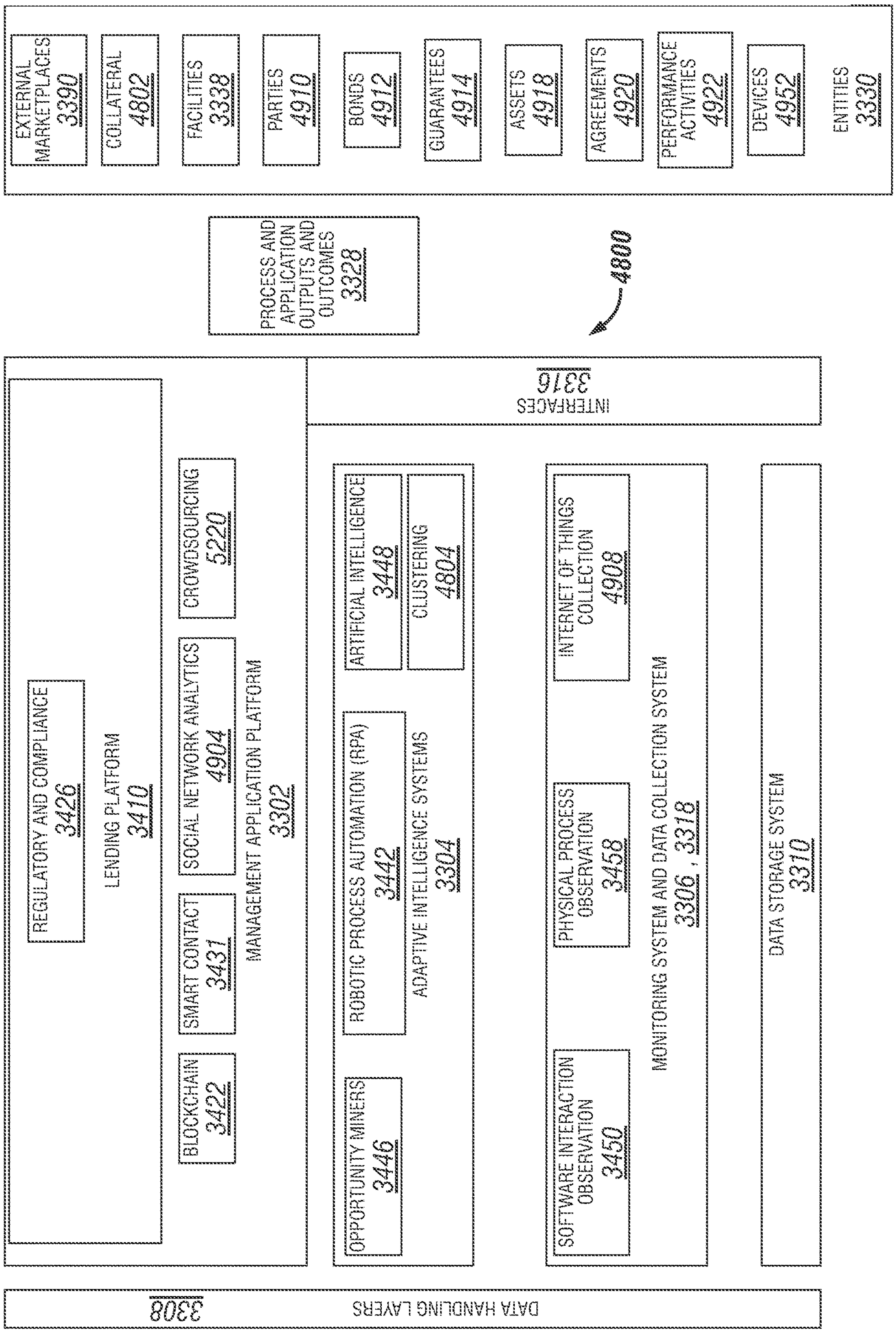
FIG. 68 depicts components and interactions of a lending platform having a regulatory and/or compliance system with a set of data-integrated microservices including data collection and monitoring services, blockchain services, artificial intelligence services, and smart contract services for automatically facilitating compliance with at least one of a law, a regulation and a policy that applies to a lending transaction.

Referring to FIG. 68, in embodiments, a lending platform is provided having a regulatory and/or compliance system 3426 with a set of data-integrated microservices including data collection and monitoring services, blockchain services, artificial intelligence services, and smart contract services for automatically facilitating compliance with at least one of a law, a regulation, and a policy that applies to a lending transaction. The system 4800 may enable one or more aspects of a regulatory and compliance solution 3426 that enables automated regulatory and compliance and/or provides a recommendation or plan for a regulatory and compliance activity relevant to a loan transaction, such as for personal loans, corporate loans, subsidized loans, student loans, or other loans, including ones that may be backed by assets, collateral, or commitments of a borrower. The regulatory and compliance solution 3426 (which in embodiments may include or use an RPA system 3442 configured for automating regulatory and compliance activities based on a training set of interactions by experts in regulatory and/or compliance activities) may include a set of interfaces, workflows, and models (which may include, use or be enabled by various adaptive intelligent systems layers 3304) and other components that are configured to enable automation of one or more aspects of a regulatory and compliance action or a regulatory and/or compliance process for a loan transaction, such as based on a set of policies, regulations, laws, requirements, specifications, conditions, attributes, events, or the like, which may include attributes of or applicable to entities 3330 involved in a lending transaction and/or the terms and conditions of loans (including smart contract 3431 terms and conditions (which may be configured or populated, e.g., based on terms and conditions that are permitted for a given set of loans)), as well as various marketplace conditions (of platform marketplaces and/or external marketplaces 3390), conditions monitored by monitoring system layers 3306 and data collection systems 3318, and the like (such as of entities 3330, including without limitation parties 4910, collateral 4802 and assets 4918, among others, as well as of interest rates, available lenders, available terms and the like), and others. For example, a user of the regulatory and compliance solution 3426 may create, configure (such as using one or more templates or libraries), modify, set or otherwise handle (such as in a user interface of the regulatory and/or compliance solution 3426 and/or RPA system 3442) various rules, thresholds, conditional procedures, workflows, model parameters, and the like that determine, or recommend, a regulatory and compliance action or plan for governing a set of loans of a given type or types based on one or more events, attributes, parameters, characteristics, conditions, states, actions, or the like, where the regulatory and compliance plan may be based on various factors (e.g., based on permitted interest rates, required notices (e.g., regarding annualized percentage rate reporting), permitted borrowers (e.g., students for federally subsidized student loans), permitted lenders, permitted issuers, income (e.g., for low-income loans), wealth (e.g., for loans that are permitted by policy to be provided only to adequately capitalized parties), location (e.g., for geographically governed lending programs, such as for municipal development), conditions of a platform marketplace or external marketplace (such as where loans are required to have interest rates that do not exceed a threshold that is calculated based on prevailing interest rates), the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others). Regulatory and compliance may include governance with respect to terms and conditions of sets of loans, selection of appropriate loans, notices required to be provided, underwriting policies, communications relevant to regulatory and compliance processes, and the like. In embodiments, the regulatory and compliance solution 3426 may automatically recommend or set rules, thresholds, actions, parameters, and the like (optionally by learning to do so based on a training set of outcomes over time), resulting in a recommended regulatory and compliance plan, which may specify a series of actions required to accomplish a recommended or desired outcome of regulatory and compliance (such as within a range of acceptable outcomes), which may be automated and may involve conditional execution of steps based on monitored conditions and/or smart contract terms, which may be created, configured, and/or accounted for by the regulatory and compliance plan. Regulatory and compliance plans may be determined and executed based at least one part on market factors (such as competing interest rates offered by other issuers, property values, borrower behavior, demographic trends, payment trends, attributes of issuers, values of collateral or assets, and the like), as well as regulatory and/or compliance factors. Regulatory and compliance plans may be generated and/or executed for new loans, for secondary loans or transactions to back loans, for collection, for consolidation, for foreclosure situations (e.g., as an alternative to foreclosure), for situations of bankruptcy or insolvency, for modifications of existing loans, for situations involving market changes (e.g., changes in prevailing interest rates, available capital, or property values), and others. In embodiments, adaptive intelligent systems layers 3304, including artificial intelligence 3448, may be trained on a training set of regulatory and compliance activities by experts and/or on outcomes of regulatory and compliance actions to generate a set of predictions, classifications, control instructions, plans, models, or the like for automated creation, management and/or execution of one or more aspects of a regulatory and compliance plan. In embodiments, events and outcomes of regulatory and compliance may be recorded in a blockchain 3422, such as in a distributed ledger, for secure access and retrieval by authorized users. Adaptive intelligent systems layers 3304 may, such as using various artificial intelligence 3448 or expert systems disclosed herein and in the documented incorporated by reference herein, improve or automate one or more aspects of regulatory and compliance, such as by training a model, a neural net, a deep learning system, or the like based on a training set of expert interactions and/or a training set of outcomes from regulatory and compliance activities.

An example lending platform is provided herein having a set of data-integrated microservices including data collection and monitoring services, blockchain services, and smart contract services for handling lending entities and transactions. An example system includes an Internet of Things and sensor platform for monitoring at least one of a set of assets and a set of collateral for a loan, a bond, or a debt transaction. An example system includes a smart contract and distributed ledger platform for managing at least one of ownership of a set of collateral and a set of events related to a set of collateral. An example system includes a smart contract system that automatically adjusts an interest rate for a loan based on information collected via at least one of an Internet of Things system, a crowdsourcing system, a set of social network analytic services, and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for negotiation of a set of terms and conditions for a loan. An example system includes a robotic process automation system for loan collection. An example system includes a robotic process automation system for consolidating a set of loans. An example system includes a robotic process automation system for managing a factoring loan. An example system includes a robotic process automation system for brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by the IoT. An example system includes a system that varies the terms and conditions of a subsidized loan based on a parameter monitored in a social network. An example system includes a system that varies the terms and conditions of a subsidized loan based on a parameter monitored by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having an Internet of Things and sensor platform for monitoring at least one of a set of assets and a set of collateral for a loan, a bond, or a debt transaction. An example system includes a smart contract and distributed ledger platform for managing at least one of ownership of a set of collateral and a set of events related to a set of collateral. An example system includes a smart contract system that automatically adjusts an interest rate for a loan based on information collected via at least one of an Internet of Things system, a crowdsourcing system, a set of social network analytic services, and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for one or more of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond.

An example system includes a system that varies the terms and conditions of a subsidized loan based on a parameter monitored by at least one of the IoT, a social network, or crowdsourcing.

An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a smart contract and distributed ledger platform for managing at least one of ownership of a set of collateral and a set of events related to a set of collateral. An example system includes a smart contract system that automatically adjusts an interest rate for a loan based on information collected via at least one of an Internet of Things system, a crowdsourcing system, a set of social network analytic services, and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan.

An example system includes an Internet of Things data collection and monitoring system for validating reliability of a guarantee for a loan. An example system includes a robotic process automation system for negotiation of a set of terms and conditions for a loan. An example system includes a robotic process automation system for loan collection. An example system includes a robotic process automation system for at least one of consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a smart contract system that automatically adjusts an interest rate for a loan based on information collected via at least one of an Internet of Things system, a crowdsourcing system, a set of social network analytic services, and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for negotiation of a set of terms and conditions for a loan. An example system includes a robotic process automation system for at least one of a loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data integrated microservices including data collection and monitoring services, blockchain services, artificial intelligence services, and smart contract services for marketing a loan to a set of prospective parties. An example system includes a rating system with a set of data integrated microservices including data collection and monitoring services, blockchain services, artificial intelligence services, and smart contract services for rating a set of loan-related entities. An example system includes a compliance system with a set of data integrated microservices including data collection and monitoring services, blockchain services, artificial intelligence services, and smart contract services for automatically facilitating compliance with at least one of a law, a regulation and a policy, related to a lending transaction.

An example lending platform is provided herein having a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond.

An example system includes an Internet of Things data collection and monitoring system with artificial intelligence for classifying a condition about a bond.

An example system includes a system that varies the terms and conditions of a subsidized loan based on a parameter monitored by at least one of the IoT, a social network, or crowdsourcing.

An example system includes an automated blockchain custody service for managing a set of custodial assets.

An example system includes an underwriting system for a loan with a set of data-integrated microservices including data collection and monitoring services, blockchain services, artificial intelligence services, and smart contract services for underwriting lending entities and transactions.

An example system includes a loan marketing system with a set of data integrated microservices including data collection and monitoring services, blockchain services, artificial intelligence services, and smart contract services for marketing a loan to a set of prospective parties.

An example system includes a rating system with a set of data-integrated microservices including data collection and monitoring services, blockchain services, artificial intelligence services, and smart contract services for rating a set of loan-related entities.

An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a robotic process automation system for negotiation of a set of terms and conditions for a loan. An example system includes a robotic process automation system for at least one of loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a loan and having a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a robotic process automation system for loan collection. An example system includes a robotic process automation system for at least one of consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a robotic process automation system for consolidating a set of loans. An example system includes a robotic process automation system for at least one of managing a factoring loan or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a robotic process automation system for managing a factoring loan. An example system includes a robotic process automation system for brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a robotic process automation system for brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes a system that varies the terms and conditions of a subsidized loan based on a parameter monitored by crowdsourcing. An example system includes an automated blockchain custody service for managing a set of custodial assets.

An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a system that varies the terms and conditions of a subsidized loan based on a parameter monitored by the IoT. An example system includes a system that varies the terms and conditions of a subsidized loan based on a parameter monitored at least one of in a social network or by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a system that varies the terms and conditions of a subsidized loan based on a parameter monitored in a social network. An example system includes a system that varies the terms and conditions of a subsidized loan based on a parameter monitored by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a system that varies the terms and conditions of a subsidized loan based on a parameter monitored by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes having a compliance system with a set of data-integrated microservices including data collection and monitoring services, blockchain services, artificial intelligence services, and smart contract services for automatically facilitating compliance with at least one of a law, a regulation, and a policy related to a lending transaction.

An example lending platform is provided herein having a loan marketing system with a set of data-integrated microservices including data collection and monitoring services, blockchain services, artificial intelligence services, and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation, and a policy related to a lending transaction. In embodiments, a lending platform is provided herein having a rating system with a set of data-integrated microservices including data collection and monitoring services, blockchain services, artificial intelligence services, and smart contract services for rating a set of loan-related entities and having a compliance system with a set of data-integrated microservices including data collection and monitoring services, blockchain services, artificial intelligence services, and smart contract services for automatically facilitating compliance with at least one of a law, a regulation, and a policy related to a lending transaction.

In embodiments, a database service may be provided herein that embodies, enables, or is associated with a blockchain, ledger, such as a distributed ledger, or the like, such as in connection with any of the embodiments described herein or in the document incorporated by reference that refer to them. In embodiments, the database service may comprise a transparent, immutable, and cryptographically verifiable ledger database service, such as the Amazon™ QLDB™ database service. The database service may be included within one or connected with one or more of the layers or microservices of a system 3300, such as the adaptive intelligent systems layers 3304 or the data handling layer 3308. The service may be used, for example, in connection with a centralized ledger that records all changes or transactions and maintains an immutable record of these changes, such as by tracing an entity through various environments or processes, tracking the history of debits and credits in a series of transactions, or validating facts relevant to an underwriting process, a claim, or a legal or regulatory proceeding. A ledger may be owned by a single trusted entity or set of trusted entities and may be shared with any other entities, such as ones that working together in a coordinated process, such as a transaction, a production process, a joint service, or many others. As compared to a relational database, the database service may provide immutable, cryptographically verifiable ledger entries, without the need for custom audit tables or trails. As compared to a blockchain framework, such a database service may include capabilities to perform queries, create tables, index data, and the like. The database service may optionally omit requirements for many blockchain frameworks that slow performance, such as requirement of consensus before committing transactions, or the database service may employ optional consensus features. In embodiments, the database service may comprise a transparent, immutable, and cryptographically verifiable ledger that users can use to build applications that act as a system of record, where multiple parties are transacting within a centralized, trusted entity or set of entities. The database service may complement or substitute for the building audit functionality into a relational database or for using conventional distributed ledger capabilities in a blockchain framework. The database service may use an immutable transactional log or journal, which may track each application data change and maintain a comprehensive and verifiable history of changes. In embodiments, transactions may be configured to comply with requirements of atomicity, consistency, isolation, and durability (ACID) to be logged in the log or journal, which is configured to prevent deletions or modifications. Changes may be cryptographically chained, such that they are auditable and verifiable, such as in a history that users can query or analyze, such as using conventional query types, such as SQL queries. In embodiments, the database service may be provided in a serverless form, such that there is no need to provision specific server capacity or to configure read/write limits. To initiate the database service, the user can create a ledger, define tables, and the like, and the database service will automatically scale to support application demands. In contrast to blockchain-based ledgers, a database service may omit requirements for a distributed consensus, so it can execute more transactions in the same time.

In embodiments of the present disclosure that refer to a blockchain or distributed ledger, a managed blockchain service may be used, such as the Amazon™ Managed Blockchain™, which may comprise a facility for convenient creation and management of a scaled blockchain network. The managed blockchain service may be provided as part of a layered data services architecture as described in this disclosure. In situations where users want immutable and verifiable capability provided by a blockchain or ledger, they may also seek the ability to allow multiple parties to transact, execute contracts (such as in smart contract embodiments described herein), share data, and the like without a trusted central authority. As setting up conventional blockchain frameworks requires significant time and technical expertise, where each participant in a permissioned network has to provision hardware, install software, create, and manage certificates for access control, and configure network settings. As a given blockchain application grows, there is also activity required to scale the network, monitor resources across blockchain nodes, add or remove hardware and manage network availability. In embodiments, a managed blockchain service may provide for management of each of these requirements and enabling capabilities. This may include supporting open source blockchain frameworks and enabling selection, setup, and deployment of a selected framework in a dashboard, console, or other user interface, wherein users may choose their preferred framework, add network members, and configure member nodes that will process transaction requests. The managed blockchain service may then automatically create a blockchain network, such as one that can span multiple accounts with multiple nodes per member, and configure software, security, and network settings. The managed blockchain service may secure and manage network certificates, such as with a key management service, which may allow customer management of the keys. In embodiments, the managed blockchain service may include one or more APIs, such as a voting API, such as one that allows network members to vote, such as to vote to add or remove members. As application usage grows for a given application (such as any of the noted applications described in connection with the platform 3300), users can add more capacity to the blockchain network, such as with a simple API call. In embodiments, the managed blockchain service may be provided with a range of combinations of compute and memory capacity, such as to give users the ability to choose the right mix of resources for a given blockchain-based application.

Figure 69:
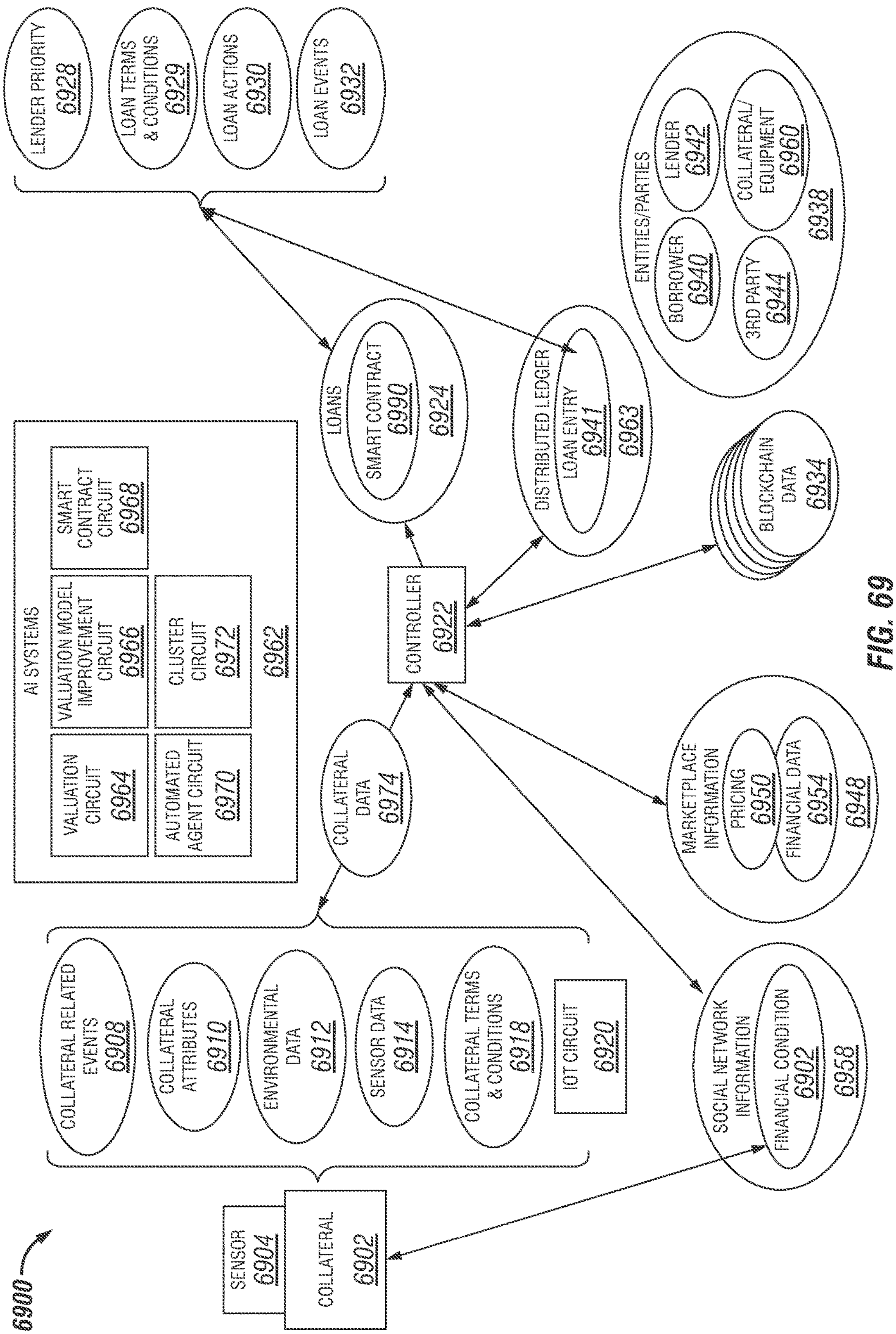
FIG. 69, depicts a system for automated loan management.

Referring to FIG. 69, a system for automated loan management is depicted. A variety of entities/parties 6938 may have a connection to a loan 6924 including a borrower 6940, a lender 6942, 3rd parties 6944 such as a neutral 3rd party (e.g. such as an assessor, or an interested 3rd party (e.g., a regulator, company employees, and the like)). A loan 6924 may be subject to a smart lending contract 6990 including information such as loan terms and conditions 6929, loan actions 6930, loan events 6932, lender priorities 6928, and the like. The smart lending contract 6990 may be recording in loan entry 6941 in a distributed ledger 6963. The smart lending contract 6990 may be stored as blockchain data 6934.

In an illustrative example, controller 6922 may receive collateral data 6974 such as collateral related events 6908, collateral attributes 6910, environmental data 6912 about an environment in which the collateral 6902 is situated, sensor data 6914 where the senor 6904 may be affixed to an item of collateral, to a case containing an item of collateral or in proximity to an item of collateral. In embodiments, collateral data may be acquired by an Internet of Things Circuit 6920, a camera system, a networked monitoring system, an internet monitoring system, a mobile device system, a wearable device system, a user interface system, and an interactive crowdsourcing system.

The controller 6922 may also monitor and/or receive data from a social network information 6958 from which a financial condition 6992 may be inferred such as a rating of a party, a tax status of a party, a credit report of the party, a credit rating of a party, a website rating of a party, a set of customer reviews for a product of a party, a social network rating of a party, a set of credentials of a party, a set of referrals of a party, a set of testimonials for a party, a set of behavior of a party, and the like. The controller 6922 may also receive marketplace information 6948 such as pricing 6950, financial data 6954 such as a publicly stated valuation of the party, a set of property owned by the party as indicated by public records, a valuation of a set of property owned by the party, a bankruptcy condition of the party, a foreclosure status of the entity, a contractual default status of the entity, a regulatory violation status of the entity, a criminal status of the entity, an export controls status of the entity, an embargo status of the entity, a tariff status of the entity, a tax status of the entity, a credit report of the entity, a credit rating of the entity, and the like.

In embodiments, artificial intelligence systems 6962 may be part of a controller 6922 or on remote systems. The AI systems 6962 may include a valuation circuit 6964 structured to determine a value for an item of collateral based on collateral data 6974 and a valuation model and a value model improvement circuit 6966 to improve the valuation model on the basis of a first set of received collateral data 6974 and the outcome of loans for which collateral associated with that first set of received collateral data acted as security. The AI systems 6962 may include an automated agent circuit 6970 that takes action based on collateral events, loan-events, and the like. Actions may include loan-related actions such as offering the loan, accepting the loan, underwriting the loan, setting an interest rate for the loan, deferring a payment requirement, modifying an interest rate for the loan, validating title for collateral, recording a change in title, assessing a value of collateral, initiating inspection of collateral, calling the loan, closing the loan, setting terms and conditions for the loan, providing notices required to be provided to a borrower, foreclosing on property subject to the loan, modifying terms and conditions for the loan, and the like. Actions may include collateral-related actions such as validating title for the one of the assigned set of items of collateral, recording a change in title for the one of the assigned set of items of collateral, assessing the value of the one of the assigned set of items of collateral, initiating inspection of the one of the assigned set of items of collateral, initiating maintenance of the one of the assigned set of items of collateral, initiating security for the one of the assigned set of items of collateral, modifying terms and conditions for the one of the assigned set of items of collateral, and the like. The AI systems 6962 may include a cluster circuit 6972 to create groups of items of collateral based on a common attribute. The cluster circuit 6972 may also determine a group of off-set items of collateral where the off-set items of collateral share a common attribute with one or more items of collateral. Data may be gathered on the off-set items of collateral and use it as representative of the items of collateral. A smart contract circuit 6968 may create a smart lending contract 6990 as described elsewhere herein.

Figure 70:
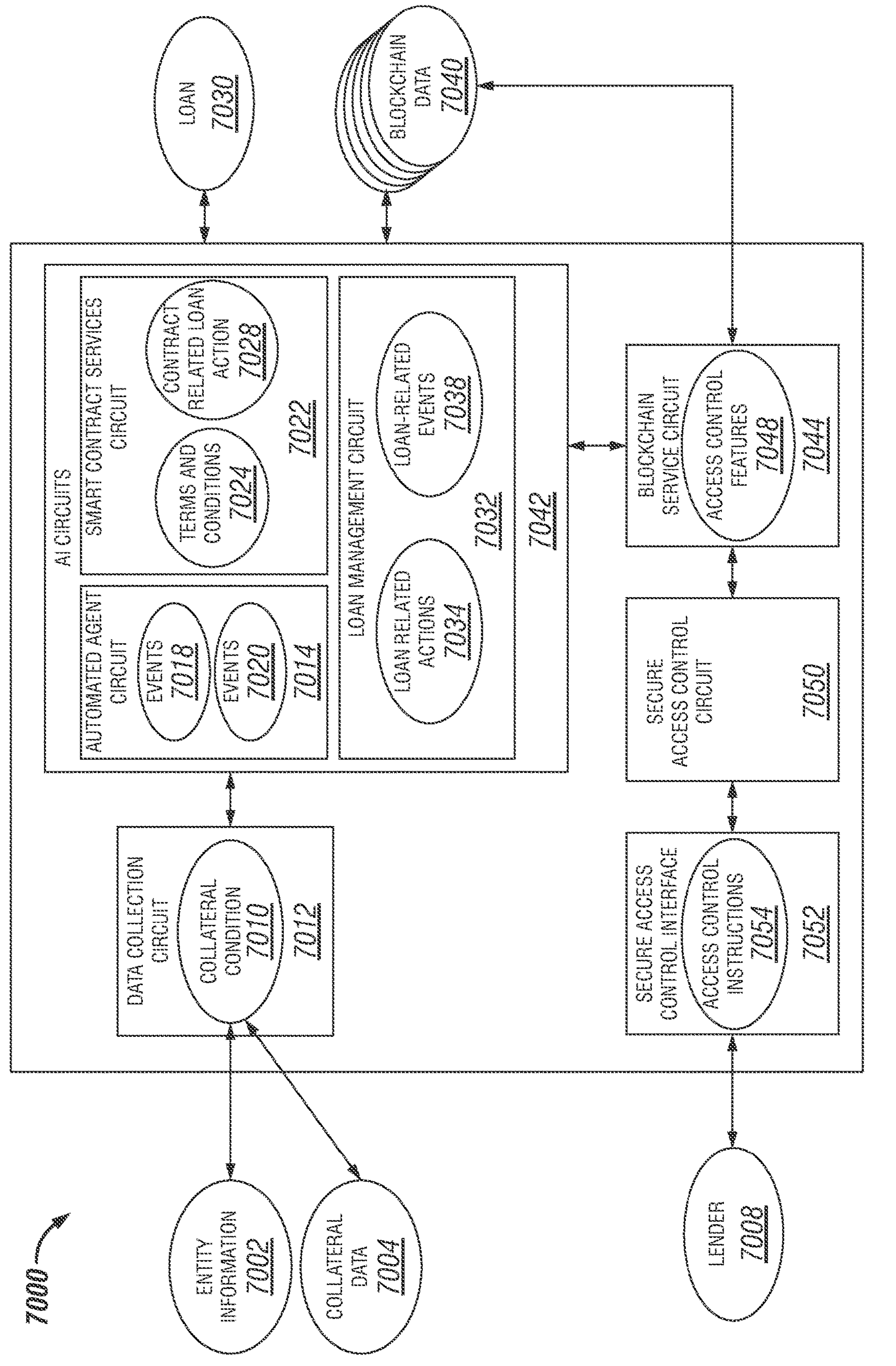
FIG. 70 depicts a system with a blockchain service circuit.

Referring to FIG. 70, a controller may include a blockchain service circuit 7044 structured to interpret a plurality of access control features 7048 such as corresponding to parties associated with a loan 7030 and associated with blockchain data 7040. The system may include a data collection circuit 7012 structured to interpret entity information 7002, collateral data 7004, and the like, such as corresponding to entities related to a lending transaction corresponding to the loan, collateral conditions, and the like. The system may include a smart contract circuit 7022 structured to specify loan terms and conditions 7024, contracts 7028, and the like, relating to the loan. The system may include a loan management circuit 7032 structured to interpret loan related actions 7034 and/or events 7038 in response to the entity information, the plurality of access control features, and the loan terms and conditions, where the loan related events are associated with the loan; implement loan related activities in response to the entity information, the plurality of access control features, and the loan terms and conditions, wherein the loan related activities are associated with the loan; and where each of the blockchain service circuit, the data collection circuit, the smart contract circuit, and the loan management circuit further comprise a corresponding application programming interface (API) component structured to facilitate communication among the circuits of the system. For example, a lender 7008 may interface with the controller through secure access control interface 7052 (e.g., through access control instructions 7054) structured to interface to the controller through a secure access control circuit 7050. The data collection circuit 7012 may be structured to receive collateral data 7004 and entity information 7002 such as information about parties to the loan such as a lender, a borrower, or a third party, an item of collateral, a machine or property associated with a party to the loan, a product of a party to the loan, and the like. Collateral data 7004 may include a type of the item of collateral, a category of the item of collateral, a value of the item of collateral, a price of a type of the item of collateral, a value of a type of the item of collateral, a specification of the item of collateral, a product feature set of the item of collateral, a model of the item of collateral, a brand of the item of collateral, a manufacturer of the item of collateral, an age of the item of collateral, a liquidity of the item of collateral, a shelf-life of the item of collateral, a useful life of the item of collateral, a condition of the item of collateral, a valuation of the item of collateral, a status of the item of collateral, a context of the item of collateral, a state of the item of collateral, a storage location of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a maintenance history of the item of collateral, a usage history of the item of collateral, an accident history of the item of collateral, a fault history of the item of collateral, a history of ownership of the item of collateral, an assessment of the item of collateral, a geolocation of the item of collateral, a jurisdictional location of the item of collateral, and the like. The data collection circuit 7012 may determine a collateral condition based on the received data. The received data 7002, 7004 and the collateral condition 7010 may be provided to AI circuits 7042, which may include an automated agent circuit 7014 (e.g., processing events 7018, 7020), a smart contract services circuit 7022, and a loan management circuit 7032.

Figure 71:
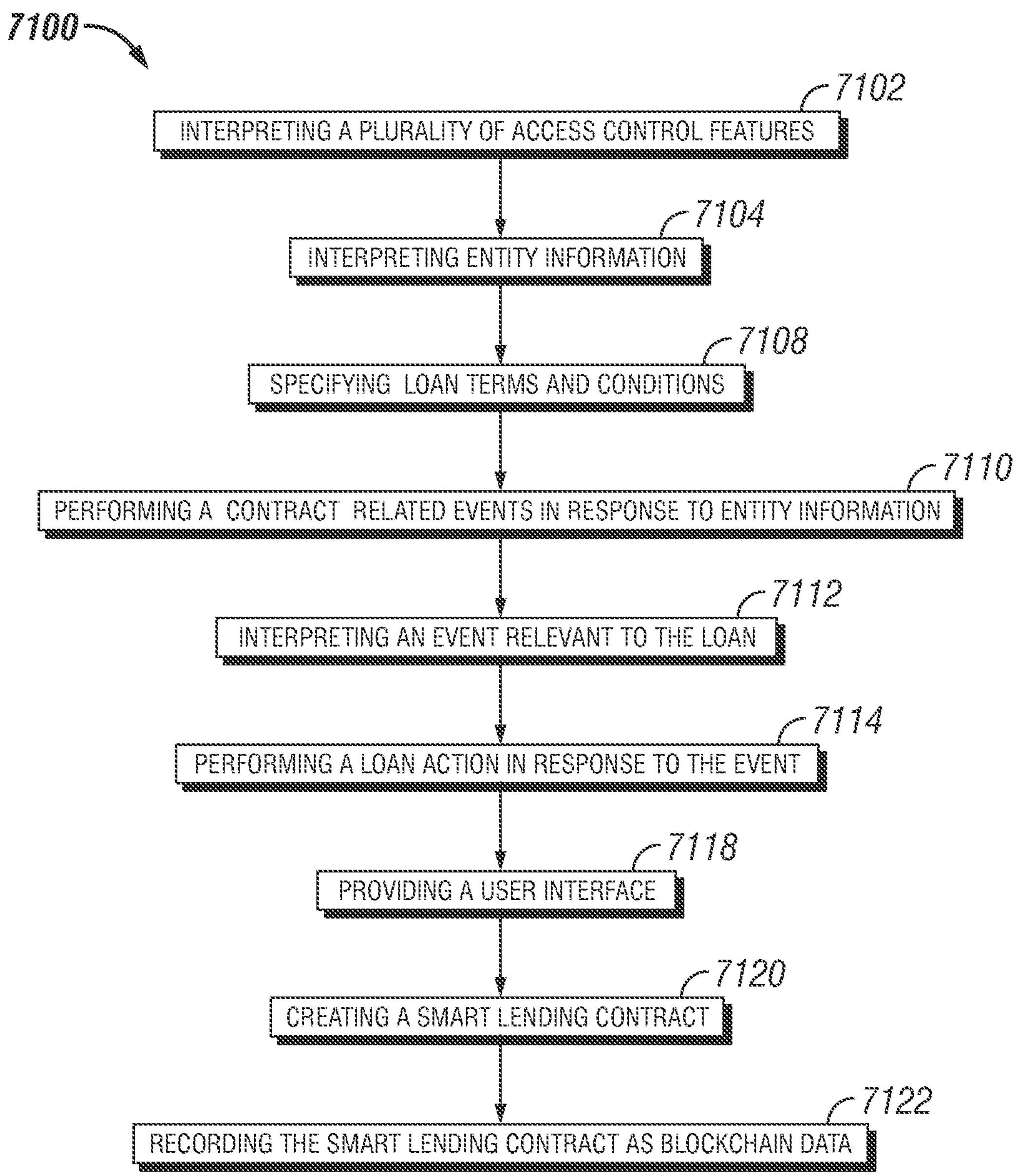
FIG. 71 depicts a method for handling a loan.

Referring to FIG. 71, an illustrative and non-limiting example method for handling a loan 7100 is depicted. The example method may include interpreting a plurality of access control features (step 7102); interpreting entity information (step 7104); specifying loan terms and conditions (step 7108); performing a contract related event in response to entity information (step 7110); interpreting an event relevant to the loan (step 7112); performing a loan action in response to the event (step 7114); providing a user interface (step 7118); creating a smart lending contract (step 7120); and recording the smart lending contract as blockchain data (step 7122).

Figure 72:
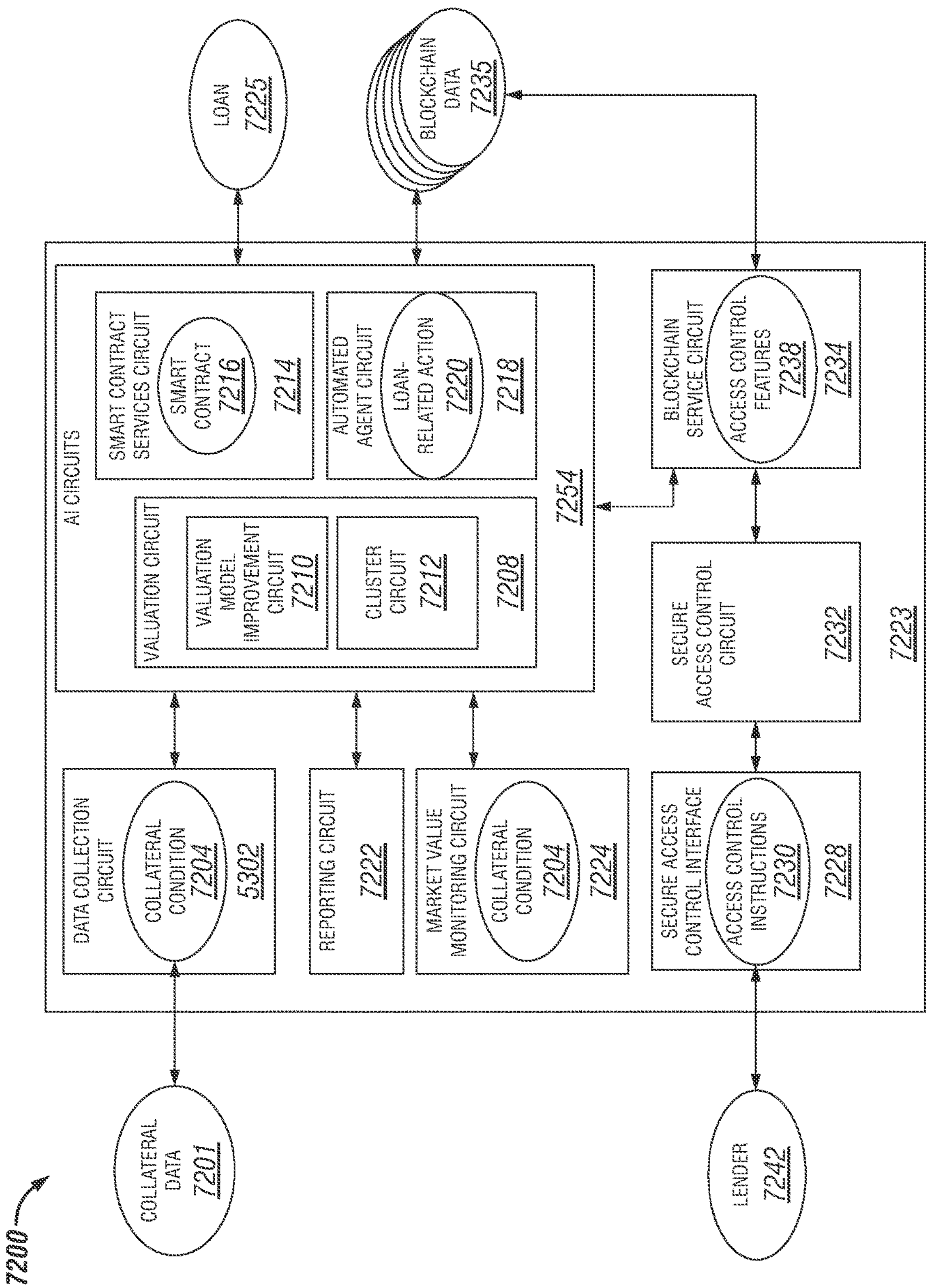
FIG. 72 depicts a system for adaptive intelligence and robotic process automation capabilities of a transactional, financial and marketplace enablement.

Referring to FIG. 72, a system 7200 for adaptive intelligence and robotic process automation capabilities of a transactional, financial, and marketplace enablement is illustrated. The system 7200 may include a controller 7223, which may include a data collection circuit 7202, which receives collateral data 7201 and determines collateral condition 7204. The controller 7223 may further include a plurality of AI circuits 7254. The plurality of AI circuits 7254 may include a valuation circuit 7208, which may include a valuation model improvement circuit 7210 and a cluster circuit 7212. The plurality of AI circuits 7254 may include a smart contract services circuit 7214 including smart lending contracts 7216 for loans 7225. The plurality of AI circuits 7254 may include an automated agent circuit 7218, which takes loan-related actions 7220. The controller 7223 may further include a reporting circuit 7222 and a market value monitoring circuit 7224, which also determines collateral condition 7204. The controller 7223 may further include a secure access user interface 7228, which receives access control instructions 7230 from lenders 7242. The access control instructions 7230 are provided to a secure access control circuit 7232, which provides instructions to blockchain service circuit 7234, which interprets access control features 7238 and provides access to a lender 7242 or other party. The blockchain service circuit 7234 all stores the collateral data and a unique collateral ID as blockchain data 7235.

Figure 73:
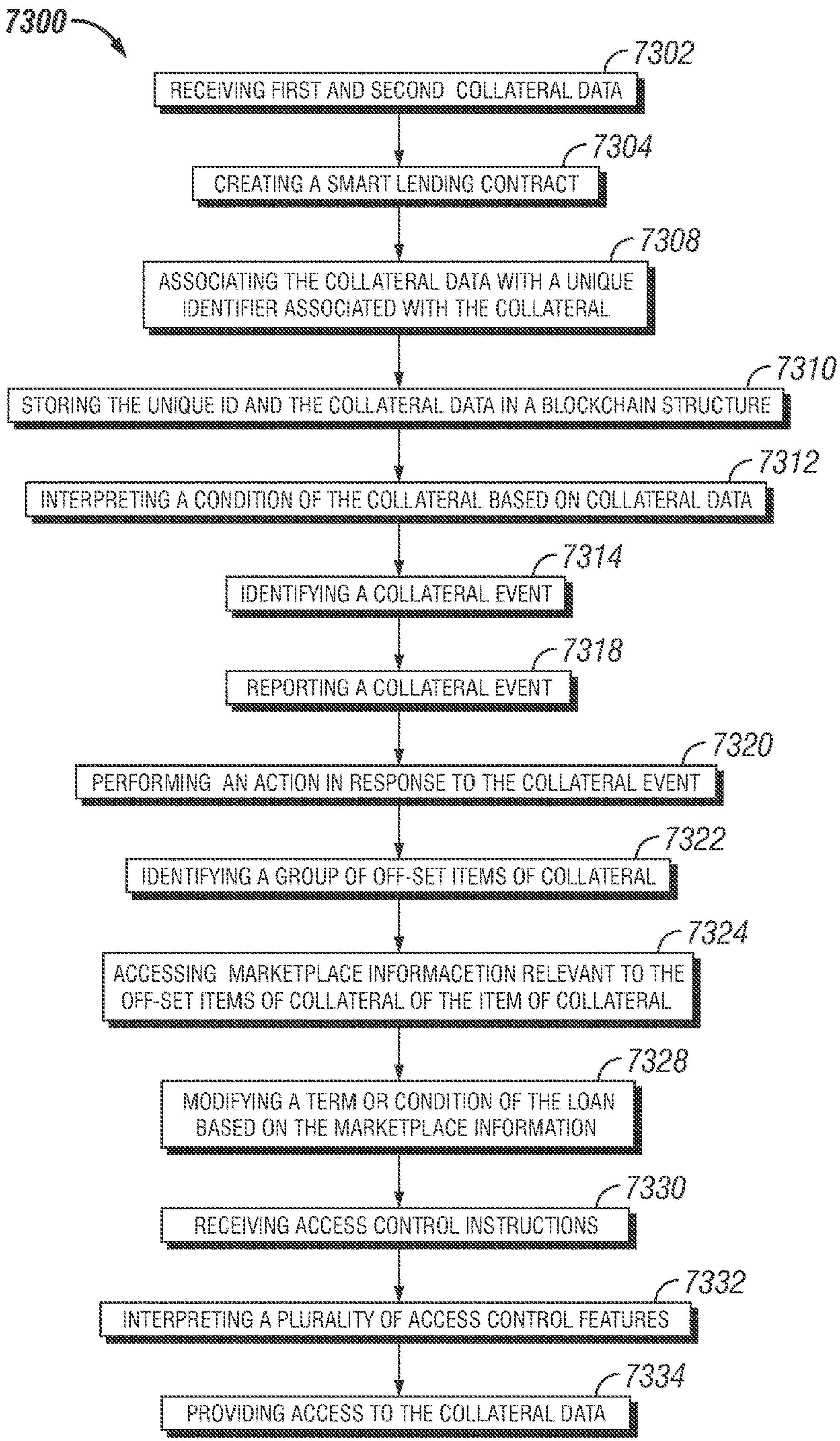
FIG. 73 depicts a method for automated smart contract creation and collateral assignment.

Referring to FIG. 73, a method 7300 for automated smart contract creation and collateral assignment is depicted. The method 7300 may include receiving first and second collateral data regarding an item of collateral 7302, creating a smart lending contract 7304, associating the collateral data with a unique identifier for the item of collateral 7308, and storing the unique identifier and the collateral in a blockchain structure 7310. The method may further include interpreting a condition of the collateral based on the collateral data 7312, identifying a collateral event 7314, reporting a collateral event 7318, and performing an action in response to the collateral 7320. The method 7300 may further include identifying a group of off-set items of collateral 7322, accessing marketplace information relevant to the off-set items of collateral or the identified item of collateral 7314, and modifying a term or condition of the loan based on the marketplace information 7328. The method 7300 may further include receiving access control instructions 7330, interpreting a plurality of access control features 7332, and providing access to the collateral date 7334.

Figure 74:
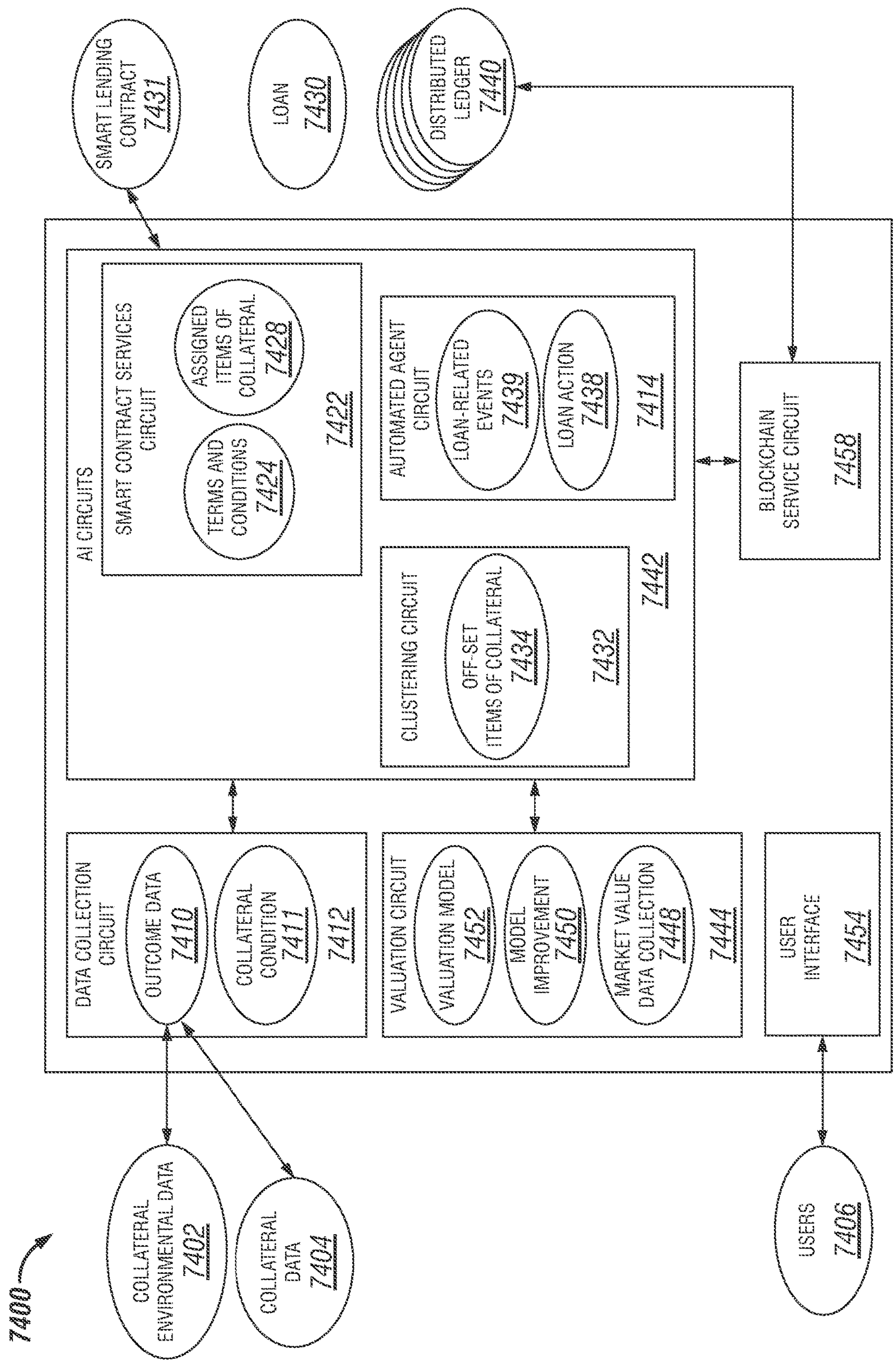
FIG. 74 depicts a system for handling a loan.

Referring to FIG. 74, an illustrative and non-limiting example system for handling a loan 7400 is depicted. The example system may include a controller 7401. The controller 7401 may include a data collection circuit 7412, a valuation circuit 7444, a user interface 7454 (e.g., for interface with a user 7406), a blockchain service circuit 7458, and several artificial intelligence circuits 7442 including a smart contract services circuit 7422, a loan management circuit 7492, a clustering circuit 7432, and an automated agent circuit 7414 (e.g., for processing loan related events 7439 and loan actions 7438).

The blockchain service circuit 7458 may be structured to interface with a distributed ledger 7440. The data collection circuit 7412 may be structured to receive data related to a plurality of items of collateral 7404 or data related to environments of the plurality of items of collateral 7402. The valuation circuit 7444 may be structured to determine a value for each of the plurality of items of collateral based on a valuation model 7452 and the received data. The smart contract services circuit 7422 may be structured to interpret a smart lending contract 7431 for a loan and to modify the smart lending contract 7431 by assigning, based on the determined value for each of the plurality of items of collateral, at least a portion of the plurality of items of collateral 7428 as security for the loan such that the determined value of the plurality of items of collateral is sufficient to provide security for the loan. The blockchain service circuit 7458 may be further structured to record the assigned at least a portion of items of collateral 7428 to an entry in the distributed ledger 7440, wherein the entry is used to record events relevant to the loan. Each of the blockchain service circuit, the data collection circuit, the valuation circuit, and the smart contract circuit may further include a corresponding application programming interface (API) component structured to facilitate communication among the circuits of the system.

Modifying the smart lending contract 7431 may further include specifying terms and conditions 7424 that govern an item selected from the list consisting of: a loan term, a loan condition, a loan-related event, and a loan-related activity. The terms and conditions 7424 may each include at least one member selected from the group consisting of: a principal amount of the loan, a balance of the loan, a fixed interest rate, a variable interest rate description, a payment amount, a payment schedule, a balloon payment schedule, a collateral specification, a collateral substitution description, a description of at least one of the parties, a guarantee description, a guarantor description, a security description, a personal guarantee, a lien, a foreclosure condition, a default condition, a consequence of default, a covenant related to any one of the foregoing, and a duration of any one of the foregoing.

The loan 7430 may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The item of collateral may include at least one item selected from the items consisting of: a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, and an item of personal property.

The data collection circuit 7412 may be further structured to receive outcome data 7410 related to the loan 7430 and a corresponding item of collateral, and wherein the valuation circuit 7444 comprises an artificial intelligent circuit structured to iteratively improve 7450 the valuation model 7452 based on the outcome data 7410.

The valuation circuit 7444 may further include a market value data collection circuit 7448 structured to monitor and report marketplace information relevant to the value of at least one of the plurality of items of collateral. The market value data collection circuit 7448 may be further structured to monitor pricing or financial data for items that are similar to the item of collateral in at least one public marketplace.

The clustering circuit 7432 may be structured to identify a set of offset items 7434 for use in valuing the item of collateral based on similarity to an attribute of the collateral.

The attribute of the collateral may be selected from among a list of attributes consisting of: a category of the collateral, an age of the collateral, a condition of the collateral, a history of the collateral, a storage condition of the collateral, and a geolocation of the collateral.

The data collection circuit 7412 may be further structured to interpret a condition 7411 of the item of collateral.

The data collection circuit may further include at least one system selected from the systems consisting of: an Internet of Things system, a camera system, a networked monitoring system, an internet monitoring system, a mobile device system, a wearable device system, a user interface system, and an interactive crowdsourcing system.

The loan includes at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

A loan management circuit 7492 may be structured to interpret an event relevant to the loan 7439 and to perform an action 7438 related to the loan in response to the event relevant to the loan.

The event relevant to the loan may include an event relevant to at least one of: a value of the loan, a condition of collateral of the loan, or an ownership of collateral of the loan.

The action related to the loan may include at least one of: modifying the terms and conditions for the loan, providing a notice to one of the parties, providing a required notice to a borrower of the loan, and foreclosing on a property subject to the loan.

The corresponding API components of the circuits may further include user interfaces structured to interact with a plurality of users of the system.

The plurality of users may each include: one of the plurality of parties, one of the plurality of entities, or a representative of any one of the foregoing. At least one of the plurality of users may include: a prospective party, a prospective entity, or a representative of any one of the foregoing.

Figure 75:
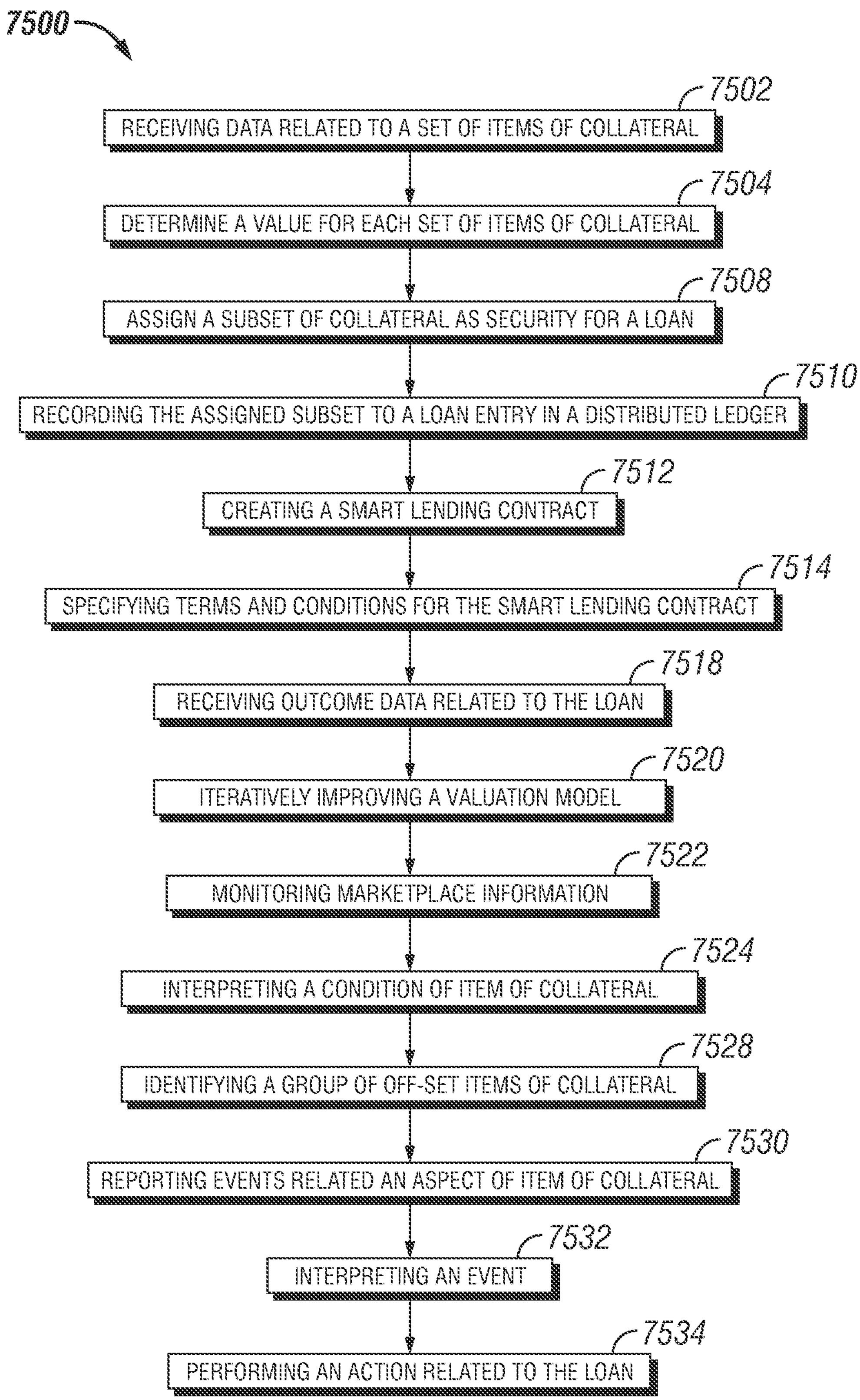
FIG. 75 depicts a method for handling a loan.

Referring to FIG. 75, an illustrative and non-limiting example method for handling a loan 7500 is depicted. The example method may include receiving data related to a plurality of items of collateral (step 7502); setting a value for each of the plurality of items of collateral (step 7504); assigning at least a portion of the plurality of items of collateral as security for a loan (step 7508); and recording the assigned at least a portion of the plurality of items of collateral to an entry in a distributed ledger, wherein the entry is used to record events relevant to the loan (step 7510). A smart lending contract may be modified for the loan (step 7512).

Terms and conditions may be specified for the loan (step 7514). The terms and conditions are each selected from the list consisting of: a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, and a consequence of default.

Outcome data related to the loan may be received (step 7518). A valuation model may be iteratively improved based on the outcome data and corresponding collateral (step 7520). Marketplace information relevant to the value of at least one of the plurality of items of collateral may be monitored (step 7522).

A set of items similar to one of the plurality of items of collateral may be identified based on similarity to an attribute of the one of the plurality of items of collateral (step 7524).

A condition of the one of the plurality of items of collateral may be interpreted (step 7528).

Events related to a value of the one of the plurality of items of collateral, a condition of the one of the plurality of items of collateral, or an ownership of the one of the items of collateral may be reported (step 7530).

An event relevant to: a value of one of the plurality of items of collateral, a condition of one of the plurality of items of collateral, or an ownership of one of the plurality of items of collateral may be interpreted (step 7532); and an action related to the secured loan in response to the event relevant to the one of the plurality of items of collateral for said secured loan may be performed (step 7534).

The loan-related action may be selected from among the actions consisting of: offering a loan, accepting a loan, underwriting a loan, setting an interest rate for a loan, deferring a payment requirement, modifying an interest rate for a loan, validating title for collateral, recording a change in title, assessing the value of collateral, initiating inspection of collateral, calling a loan, closing a loan, setting terms and conditions for a loan, providing notices required to be provided to a borrower, foreclosing on property subject to a loan, and modifying terms and conditions for a loan.

Figure 76:
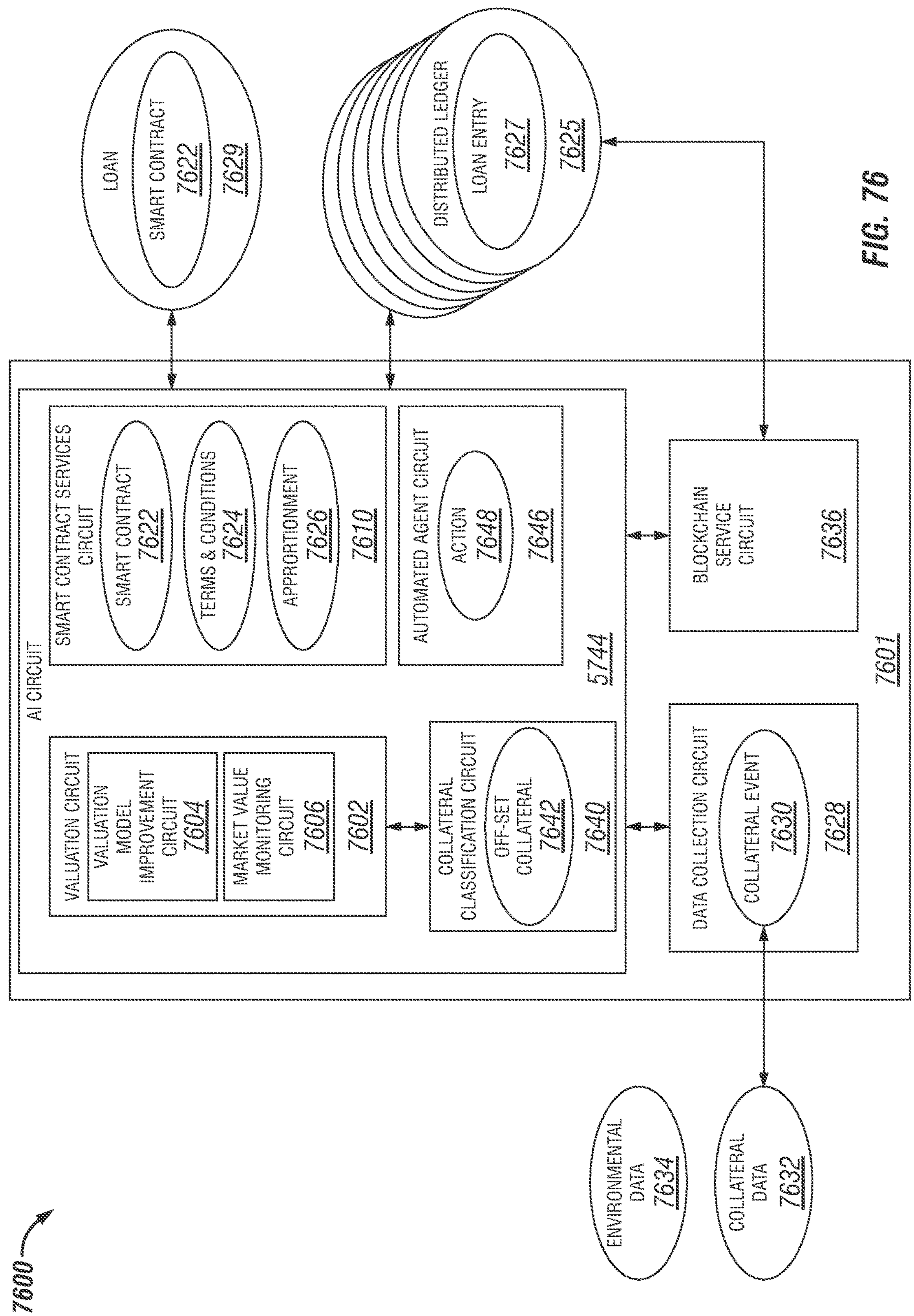
FIG. 76 depicts a system for adaptive intelligence and robotic process automation.

Referring to FIG. 76, an illustrative and non-limiting example system for adaptive intelligence and robotic process automation capabilities 7600 is depicted. The example system may include a controller 7601. The controller may include a data collection circuit 7628 which may collect data such as collateral data 7632, environmental data 7634 related to the collateral, and the like from a variety of sources and systems such as: an Internet of Things system, a camera system, a networked monitoring system, an internet monitoring system, a mobile device system, a wearable device system, a user interface system, and an interactive crowdsourcing system. Based on the received data 7632, 7634 the data collection circuit 7628 may identify a collateral event 7630.

The controller 7601 may also include a variety of AI circuits 7644, including a valuation circuit 7602 which may, based in part on the received data 7632, 7634, determine a value for an item of collateral. The valuation circuit 7602 may include a market value monitoring circuit 7606 structured to determine market data regarding an item of collateral or an off-set item of collateral, where the market data may contribute to the valuation for the item of collateral. The AI circuits may also include a smart contract services circuit 7610 to facilitate services related to a loan 7629 such as creating a smart contract 7622, identifying terms and conditions 7624 for the smart contract 7622, identifying lender priorities and tracking apportionment of value 7626 among lenders. The smart contract services circuit 7610 may provide data to a block chain service circuit 7636, which is able to create and modify a loan entry 7627 on a distributed ledger 7625 where the loan entry 7627 may include terms and conditions, data regarding items of collateral used to secure the loan, lender priority and apportionment of value, and the like. The AI circuits 7644 may also include a collateral classification circuit 7640, which creates groups of off-set items of collateral 7604, which share at least one attribute with one of the items of collateral, where the common attribute may be a category of the items, an age of the items, a condition of the items, a history of the items, an ownership of the items, a caretaker of the items, a security of the items, a condition of an owner of the items, a lien on the items, a storage condition of the items, a geolocation of the items, a jurisdictional location of the items, and the like. The use of off-set items of collateral 7642 may facilitate the market value monitoring circuit 7606 in obtaining relevant market data and in the overall determination of value for an item of collateral.

The data collection circuit 7628 may utilize the received data and a determination of value for an item of collateral to identify a collateral event 7630. Based on the collateral event 7630, an automated agent circuit 7646 may take an action 7648. The action 7648 may be a loan-related action such as offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, and the like. The action 7648 may be a collateral-related action such as validating title for the one of a set of items of collateral, recording a change in title for one of a set of items of collateral, assessing the value of the one of a set of items of collateral, initiating inspection of one of a set of items of collateral, initiating maintenance of one of a set of items of collateral, initiating security for one of a set of items of collateral, modifying terms and conditions for one of a set of items of collateral, and the like.

Figure 77:
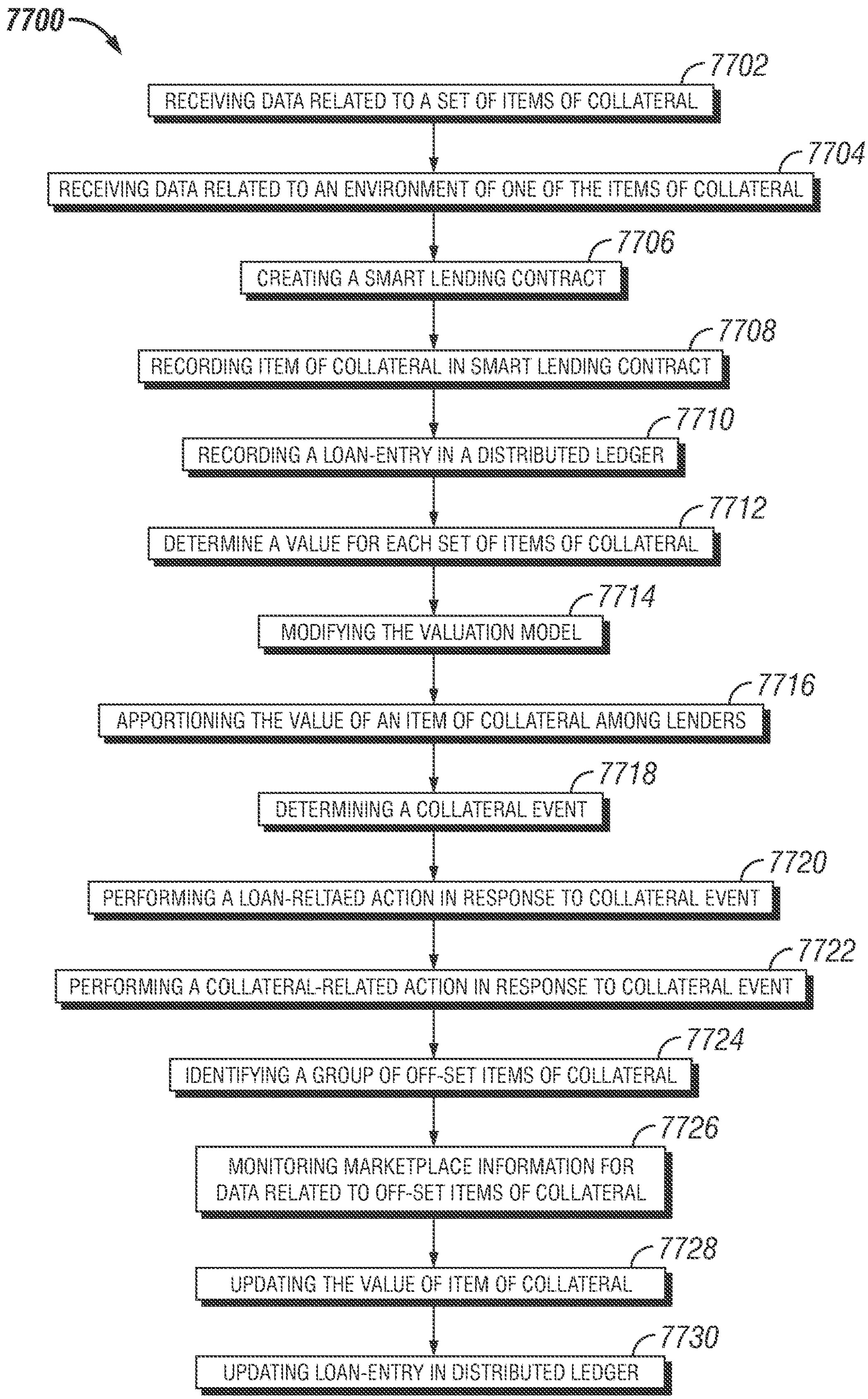
FIG. 77 depicts a method for loan creation and management.

Referring to FIG. 77, an illustrative and non-limiting example method 7700 for loan creation and management is depicted. The example method 7700 may include receiving data related to a set of items of collateral (step 7702) that provide security for a loan and receiving data related to an environment of one of a set of items of collateral (step 7704). A smart lending contract for the loan may be created (step 7706) and the set of items of collateral may be recorded in the smart lending contract (step 7708). A loan-entry may be recoded in a distributed ledger (step 7770) where the loan entry includes the smart lending contract or a reference to the smart contract.

The value for each of the set of items of collateral may be determined (7772) and the value of the items of collateral may be apportioned among lenders (step 7776) based on the priority of the different lenders. The valuation model may be modified (step 7774) based on a learning set including a set of valuation determinations of a set of items of collateral and the outcomes of loans having those items of collateral as security and the valuation of those items of collateral.

A collateral event may be determined (step 7778) based on received data or a valuation of one of the items of collateral. A loan-related action may be performed in response to the determined collateral event (step 7780) where the loan-related action includes offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, or the like.

A collateral-related action may be performed in response to the determined collateral event (step 7782), where the collateral-related action includes validating title for the one of the set of items of collateral, recording a change in title for the one of the set of items of collateral, assessing the value of the one of the set of items of collateral, initiating inspection of the one of the set of items of collateral, initiating maintenance of the one of the set of items of collateral, initiating security for the one of the set of items of collateral, modifying terms and conditions for the one of the set of items of collateral, or the like.

One or more group of off-set items of collateral may be identified (step 7784) where each item in a group of off-set items of collateral shares a common attribute with at least one of the items of collateral. Marketplace information may then be monitored for data related to off-set items of collateral (step 7786). The monitored marketplace information regarding one or more off-set items of collateral may be used to update a value of an item of collateral (step 7788). The loan-entry in the distributed ledger may be updated (7730) with the updated value of the item of collateral.

Figure 78:
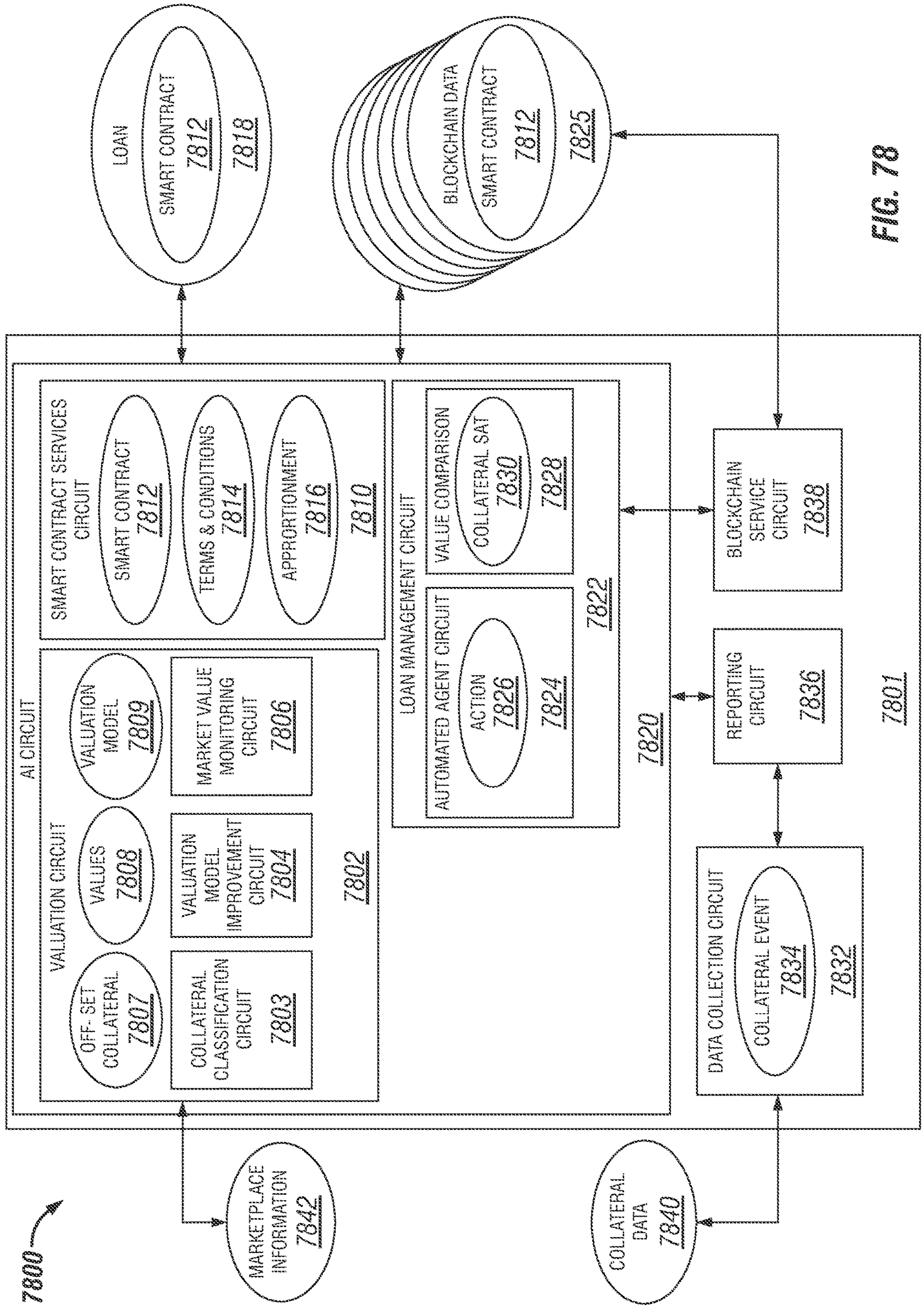
FIG. 78 depicts a system for adaptive intelligence and robotic process automation capabilities of a transactional, financial and marketplace enablement.

Referring to FIG. 78, an example system 7800 for adaptive intelligence and robotic process automation capabilities of a transactional, financial, and marketplace enablement is depicted. The system 7800 may include a controller 7801, which may include a plurality of AI circuits 7820. The plurality of AI circuits 7820 may include a smart contract services circuit 7810 to create and modify a smart lending contract 7812 for a loan 7818. Smart lending contracts 7812 may include the terms and conditions 7814 for the loan 7818, a covenant specifying a required value of collateral, information regarding a loan 7818, items of collateral, and information on lenders, including lender priorities including apportionment 7816 of the value of items of collateral among the lenders.

The plurality of AI circuits 7820 may include a valuation circuit 7802 structured to determine one or more values 7808 for items of collateral based on a valuation model 7809 and collateral data 7840. The valuation circuit 7802 may include a collateral classification circuit 7803 to identify items of off-set collateral 7807 based on common attributes with items of collateral used to secure a loan 7818. A market value monitoring circuit 7806 may receive marketplace information 7842 regarding items of collateral and off-set items of collateral 7807. The marketplace information 7842 may be used by the valuation model 7809 in determining values 7808 for items of collateral. The valuation circuit 7802 may further include a valuation model improvement circuit 7804 to improve the valuation model 7809 used to determine values 7808. The valuation model improvement circuit 7804 may utilize a training set including previously determined values 7808 for items of collateral and data regarding the outcome of loans for which those items of collateral acted as security.

The plurality of AI circuits 7820 may include a loan management circuit 7822, which may include a value comparison circuit 7828 to compare a value 7808 of an item of collateral with a required value of the item of collateral as specified in a covenant of the loan, determining a collateral satisfaction value 7830. The smart contract services circuit 7810 may determine, in response to the collateral satisfaction value 7830, a term or a condition 7814 for a loan 7818, where the term of conditions 7814 is related to a loan component such as a loan party, a loan collateral, a loan-related event, and a loan-related activity for the smart lending contract 7812, and the like. The term of condition may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like. The term of condition may be a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, a consequence of default, and the like. The smart contract services circuit 7810 may modify the smart lending contract 7812 to include new terms or conditions 7814, such as those determined in response to the collateral satisfaction value 7830.

The loan management circuit 7822 may also include an automated agent circuit 7824 to take an action 7826 based on the collateral satisfaction value 7830. The action 7826 may be a collateral-related action such as validating title for the item of collateral, recording a change in title for the item of collateral, assessing the value of the item of collateral, initiating inspection of the item of collateral, initiating maintenance of the item of collateral, initiating security for the item of collateral, modifying terms and conditions for the item of collateral, and the like. The action 7826 may be a loan-related action such as offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, and the like.

The controller 7801 may also include a data collection circuit 7832 to receive collateral data 7840 and determine a collateral event 7834. The collateral event 7834 and collateral data 7840 may then be reported by a reporting circuit 7836. A blockchain service circuit 7838 may create and update blockchain data 7825 where a copy of the smart lending contract 7812 is stored.

Figure 79:
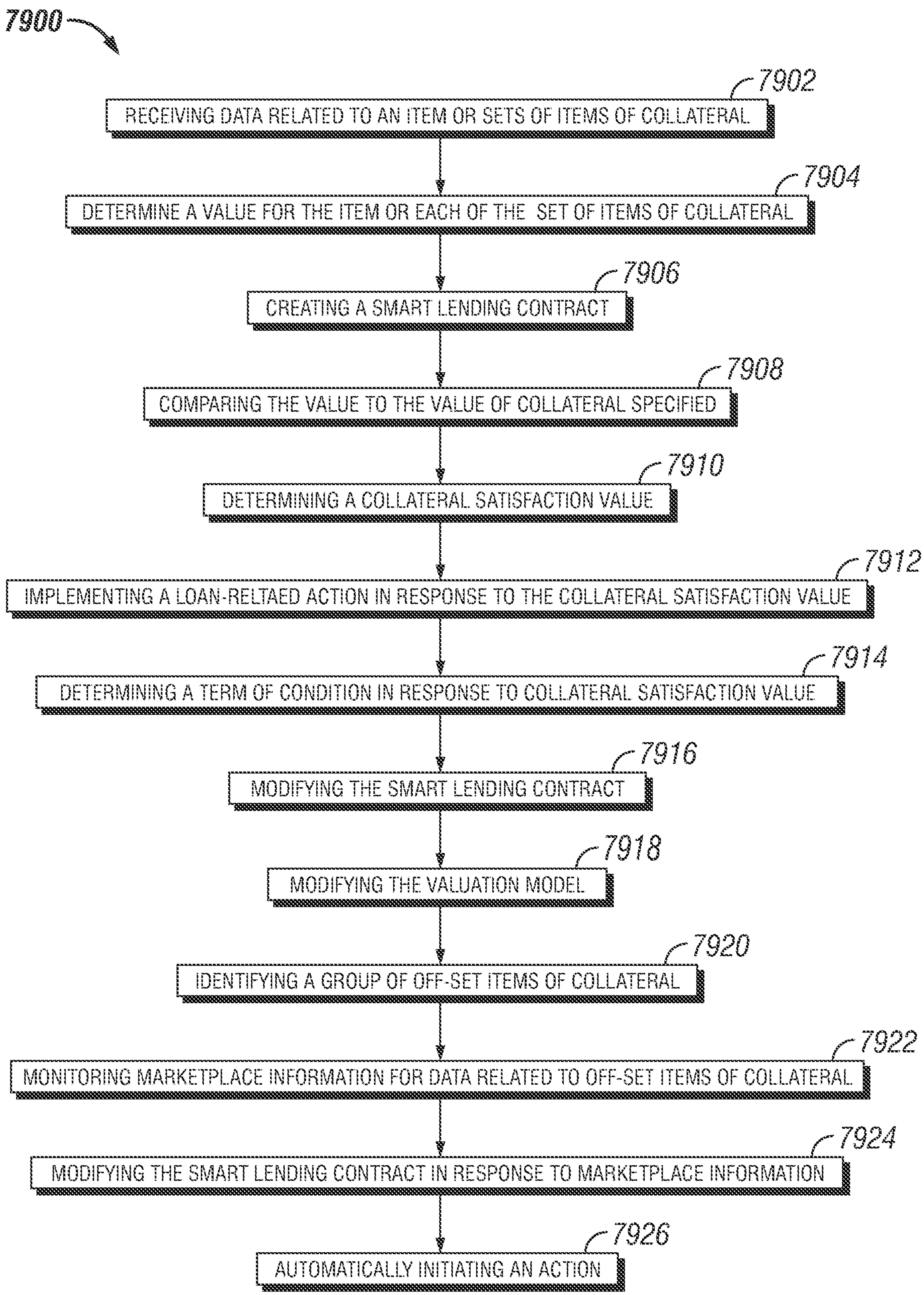
FIG. 79 depicts a method for robotic process automation of transactional, financial and marketplace activities.

Referring to FIG. 79, an illustrative and non-limiting method for robotic process automation of transactional, financial, and marketplace activities is depicted. An example method may include receiving data related to an item or set of items of collateral (step 7902) where the item(s) of collateral are acting as security for a loan. A value for the item of collateral is determined (step 7904) based on received data and a valuation model. A smart lending contract is created (step 7906), which specifies information about the loan including a covenant specifying a required value of collateral needed to secure the loan.

The value of the item(s) of collateral may be compared to the value of collateral specified in the covenant (step 7908) and a collateral satisfaction value determined (step 7910), where the collateral satisfaction value may be positive if the value of the collateral exceeds the required value of collateral or negative if the value of collateral is less than the required value of collateral. A loan-related action may be implemented in response to the collateral satisfaction value (step 7912). A term or condition may be determined in response to the collateral satisfaction value (step 7914) and the smart lending contract modified (step 7916).

The valuation model may be modified (step 7918) based on a first set of valuation determinations for a first set of items of collateral and a corresponding set of loan outcomes having the first set of items of collateral as security, using a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system of at least two of any of the foregoing, and the like.

A group of off-set items of collateral may be identified (step 7920) based on common attributes with the collateral such as a category of the item of collateral, an age of the item of collateral, a condition of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a geolocation of the item of collateral, and a jurisdictional location of the item of collateral. Marketplace information such as may be monitored for data related to the off-set collateral (step 7922) such as pricing or financial data and the smart lending contract modified in response to the marketplace information (step 7924). An action may be automatically initiated (step 7926) based on the marketplace information. The action may include modifying a term of the loan, issuing a notice of default, initiating a foreclosure action modifying a condition of the loan, providing a notice to a party of the loan, providing a required notice to a borrower of the loan, foreclosing on a property subject to the loan, validating title for the item of collateral, recording a change in title for the item of collateral, assessing the value of the item of collateral, initiating inspection of the item of collateral, initiating maintenance of the item of collateral, initiating security for the item of collateral, and modifying terms and conditions for the item of collateral, and the like.

Figure 80:
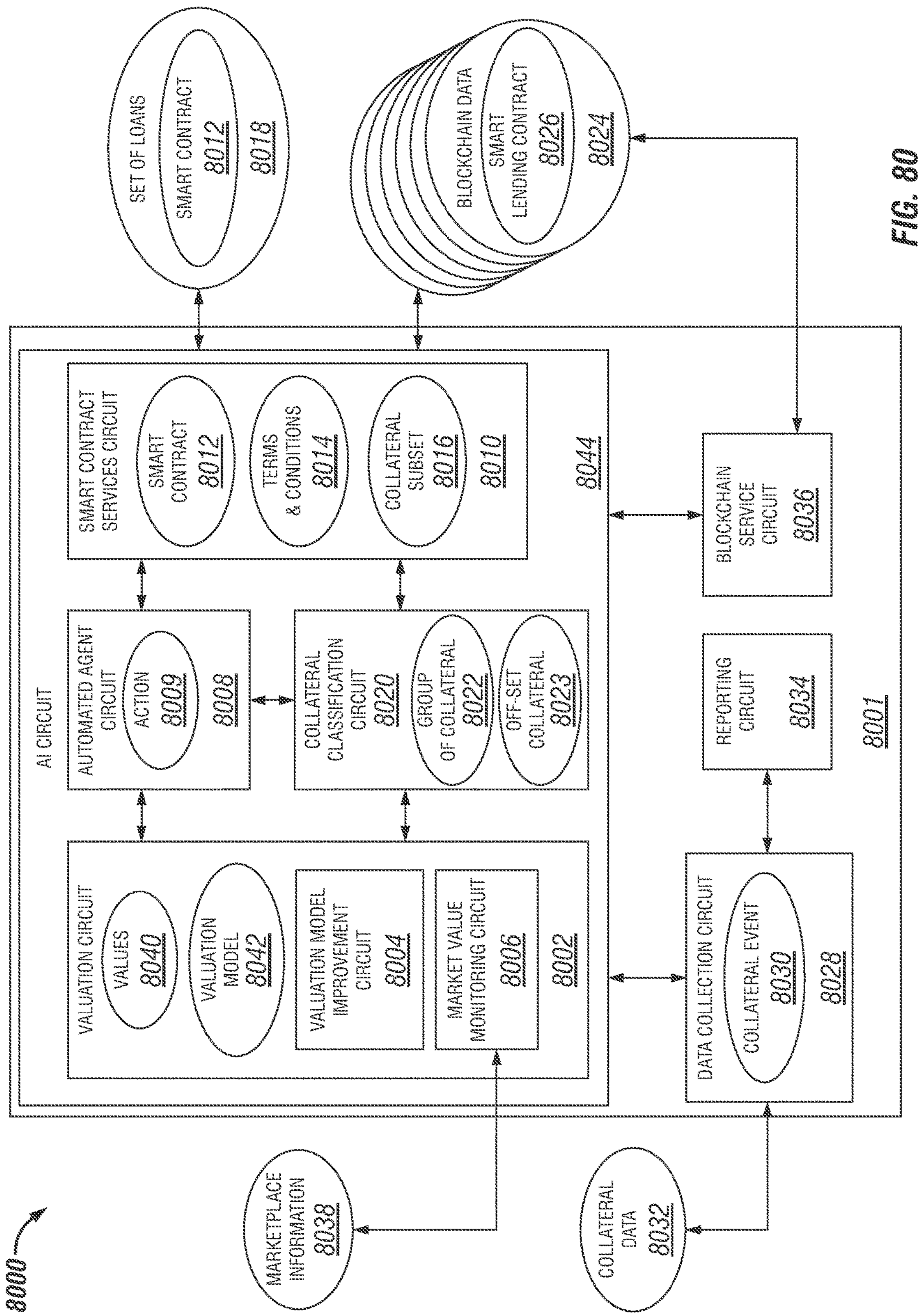
FIG. 80 depicts a system for adaptive intelligence and robotic process automation.

Referring to FIG. 80, an illustrative and non-limiting example system for adaptive intelligence and robotic process automation capabilities 8000 is depicted. The example system may include a controller 8001 including a data collection circuit 8028 structured to receive collateral data 8032 regarding a plurality of items of collateral used to secure a set of loans 8018. The data collection circuit 8028 may include an Internet of Things system, a camera system, a networked monitoring system, an internet monitoring system, a mobile device system, a wearable device system, a user interface system, an interactive crowdsourcing system, and the like. The items of collateral may include a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, an item of personal property, and the like. The set of loans may include an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like. The set of loans 8018 may be distributed among a plurality of borrowers as means of diversifying the risk of the loans.

The controller 8001 may also include a plurality of AI circuits 8044, including a collateral classification circuit 8020, to identify, from among the items of collateral, a group of collateral 8022, which related by sharing a common attribute, wherein the common attribute is among the received collateral data 8032, such as a type of the item of collateral, a category of the item of collateral, a value of the item of collateral, a price of a type of the item of collateral, a value of a type of the item of collateral, a specification of the item of collateral, a product feature set of the item of collateral, a model of the item of collateral, a brand of the item of collateral, a manufacturer of the item of collateral, an age of the item of collateral, a liquidity of the item of collateral, a shelf-life of the item of collateral, a useful life of the item of collateral, a condition of the item of collateral, a valuation of the item of collateral, a status of the item of collateral, a context of the item of collateral, a state of the item of collateral, a storage location of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a maintenance history of the item of collateral, a usage history of the item of collateral, an accident history of the item of collateral, a fault history of the item of collateral, a history of ownership of the item of collateral, an assessment of the item of collateral, a geolocation of the item of collateral, a jurisdictional location of the item of collateral, and the like. The collateral classification circuit 8020 may also identify off-set collateral 8023 where items of off-set collateral 8023 and the items of collateral share a common attribute.

The reporting circuit 8034 may also report a collateral event 8030 based on the collateral data 8032. An automated agent circuit 8008 may automatically perform an action 8009 based on the collateral event 8030. The action 8009 may be a collateral-related action such as validating title for one of the plurality of items of collateral, recording a change in title for one of the plurality of items of collateral, assessing the value of one of the plurality of items of collateral, initiating inspection of one of the plurality of items of collateral, initiating maintenance of the one of the plurality of items of collateral, initiating security for one of the plurality of items of collateral, modifying terms and conditions for one of the plurality of items of collateral, and the like. The action 8009 may be a loan-related action such as offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, and the like.

The controller 8001 may also include a smart contract services circuit 8010 to create a smart lending contract 8012 for an individual loan or a set of loans 8018 where the smart lending contract 8012 identifies a subset of collateral 8016 selected from the group of related items of collateral 8022 sharing a common attribute to act as security for the set of loans 8018. The smart contract services circuit 8010 may also redefine the subset of collateral 8016 based on an updated value for an item of collateral, thus rebalancing the items of collateral used for a set of loans based on the values of the collateral items. The identification of the subset of collateral 8016 may be identified in real-time when the common attribute changes in real time (e.g. a status of an item of collateral or whether collateral is in transit during a defined time period). Further, the smart contract services circuit 8010 may determine a term or condition 8014 for the loan based on a value of one of the items of collateral, where the term or the condition 8014 is related to a loan component such as a loan party, a loan collateral, a loan-related event, and a loan-related activity. The term or condition 8014 may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like.

The controller may also include a valuation circuit 8002 to determine a value 8040 for each item of collateral in the subset of items of collateral based on the received data and a valuation model 8042. A valuation model improvement circuit 8004 may modify the valuation model 8042 based on a first set of valuation determinations for a first set of items of collateral and a corresponding set of loan outcomes having the first set of items of collateral as security. The valuation model improvement circuit 8004 may include a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system including at least two of the foregoing, or the like. The valuation circuit 8002 may also include a market value data collection circuit 8006 to monitor and report marketplace information 8038 such as pricing or financial data relevant to off-set collateral 8023 or a group of collateral 8022.

Figure 81:
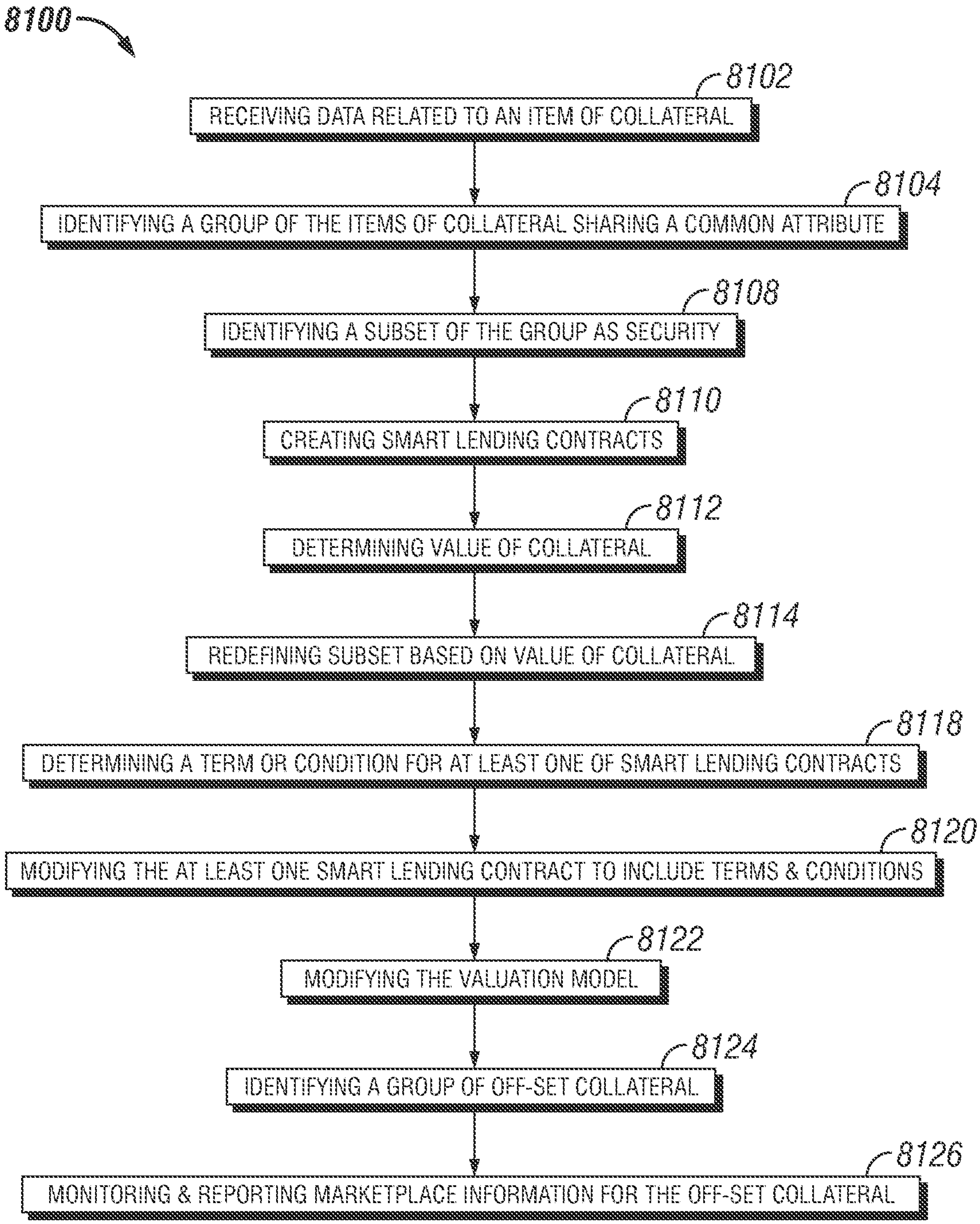
FIG. 81 depicts a method for automated transactional, financial and marketplace activities.

Referring to FIG. 81, a method 8100 for automated transactional, financial, and marketplace activities is depicted. A method may include receiving data related to an item of collateral (step 8102), identifying a group of items of collateral (step 8104) where the items in the group share a common attribute or feature, identifying a subset of the group as security for a set of loans (8108), and creating a smart lending contract (step 8110) for the set of loans where the smart lending contract identifies the subset of group acting as security. The common attribute shared by the group of items of collateral may be in the received data.

The value of each item of collateral may be determined (8112) using the received data and a valuation model. The subset of collateral used as security may then be redefined based on the value of the different items of collateral (8114). A term of condition for at least one of the smart lending contracts may be determined (8118) based on the value for at least one of the items of collateral in the subset of the group and the smart lending contract modified to include the determined term or condition (8120). Further, in some embodiments, the valuation model may be modified (8122) based on a first set of valuation determinations for a first set of items of collateral and a corresponding set of loan outcomes having the first set of items of collateral as security.

A group of off-set items of collateral may be identified (step 8124) where each member of the group of off-set items of collateral and the group of the plurality of items share a common attribute. An information marketplace may be monitored and marketplace information reported (step 8126) for the group of off-set items of collateral.

Figure 82:
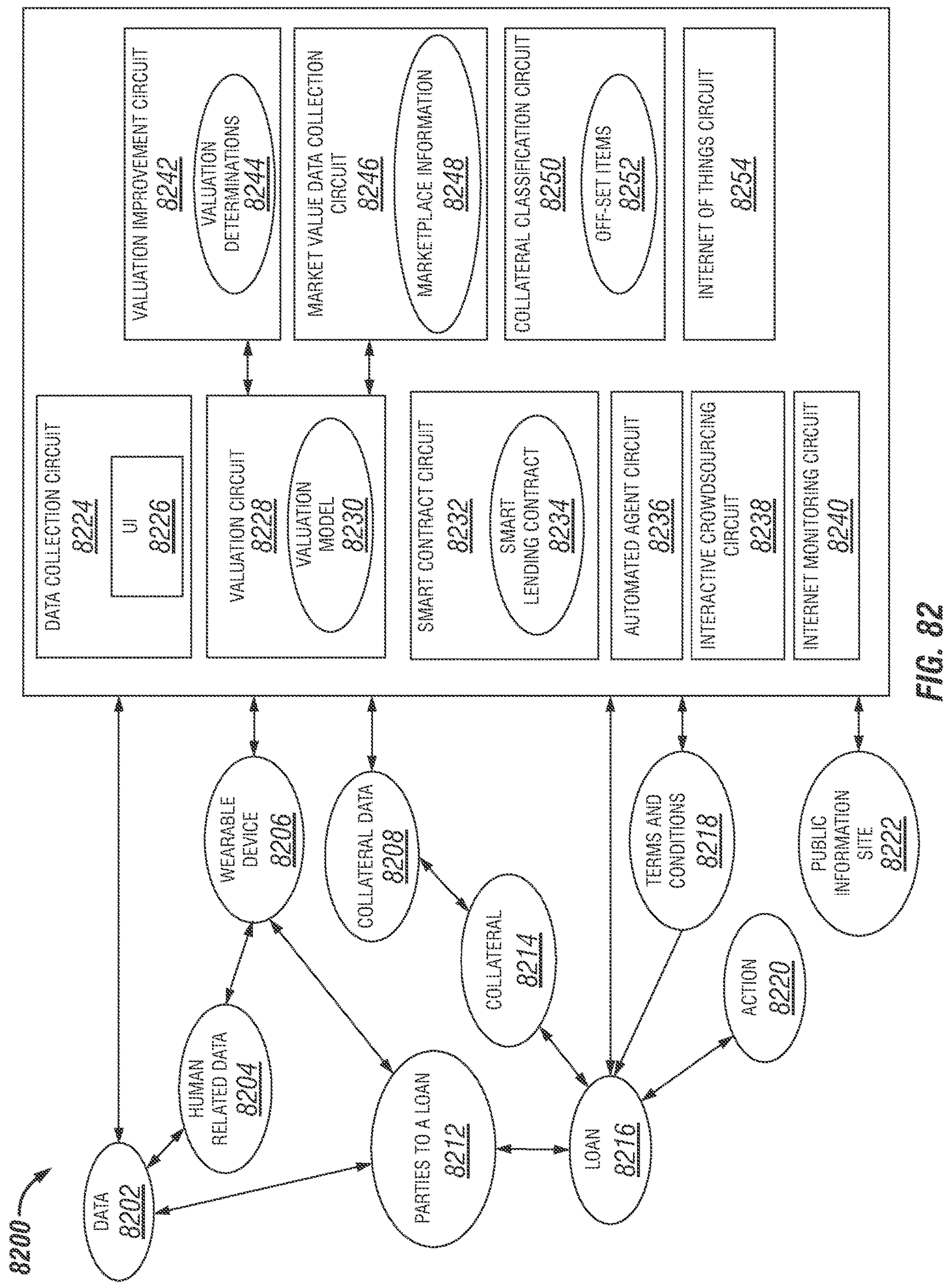
FIG. 82 depicts a system for adaptive intelligence and robotic process.

FIG. 82 depicts a system 8200 including a data collection circuit 8224 structured to receive data 8202 related to a set of parties to a loan 8212. The data collection circuit may be structured to receive collateral-related data 8208 related to a set of items of collateral 8214 acting as security for the loan and determine a condition of the set of items of collateral, where the change in the interest rate may be based on a condition of the set of items of collateral. The item of collateral may be a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, an item of personal property, and the like. The received data may include an attribute of the set of parties to the loan, where the change in the interest rate may be based in part on the attribute. The data collection circuit may include a system such as an Internet of Things circuit, an image capture device, a networked monitoring circuit, an internet monitoring circuit, a mobile device, a wearable device, a user interface circuit, an interactive crowdsourcing circuit, and the like. For instance, the data collection circuit may include an Internet of Things circuit 8254 structured to monitor attributes of the set of parties to the loan. The data collection circuit may include a wearable device 8206 associated with at least one of the set of parties, where the wearable device is structured to acquire human-related data 8204, and where the received data includes at least a portion of the human-related data. The data collection circuit may include a user interface circuit 8226 structured to receive data from the parties of the loan and provide the data from at least one of the parties of the loan as a portion of the received data. The data collection circuit may include an interactive crowdsourcing circuit 8238 structured to solicit data regarding at least one of the set of parties of the loan, receive solicited data, and provide at least a subset of the solicited data as a portion of the received data. The data collection circuit may include an internet monitoring circuit 8240 structured to retrieve data related to the parties of the loan from at least one publicly available information site 8222. The system may include a smart contract circuit 8232 structured to create a smart lending contract 8234 for the loan 8216. The loan may be a type selected from among loan types such as an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like. The smart contract circuit may be structured to determine a term or a condition 8218 for the smart lending contract based on the attribute and modify the smart lending contract to include the term or the condition. The term or condition may be related to a loan component, such as a loan party, a loan collateral, a loan-related event, a loan-related activity, and the like. The term or condition may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like. The system may include an automated agent circuit 8236 structured to automatically perform a loan-related action 8220 in response to the received data, where the loan-related action is a change in an interest rate for the loan, and where the smart contract circuit may be further structured to update the smart lending contract with the changed interest rate. The system may include a valuation circuit 8228 structured to determine, such as based on the received data and a valuation model 8230, a value for the at least one of the set of items of collateral. The smart contract circuit may be structured to determine a term or a condition for the smart lending contract based on the value for the at least one of the set of items of collateral and modify the smart lending contract to include the term or the condition. The term or the condition may be related to a loan component, such as a loan party, a loan collateral, a loan-related event, a loan-related activity, and the like. The term or the condition may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like. The valuation circuit may include a valuation model improvement circuit 8242, where the valuation model improvement circuit may modify the valuation model, such as based on a first set of valuation determinations 8244 for a first set of items of collateral and a corresponding set of loan outcomes having the first set of items of collateral as security. The valuation model improvement circuit may include a system such as a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system including at least two of the foregoing, and the like. The change in the interest rate may be further based on the value for the at least one of the set of items of collateral. The valuation circuit may include a market value data collection circuit 8246 structured to monitor and report marketplace information 8248 for offset items of collateral relevant to the value of the item of collateral. The market value data collection circuit may be structured to monitor one of pricing or financial data for the offset items of collateral in at least one public marketplace and report the monitored one of pricing or financial data. The system may include a collateral classification circuit 8250 structured to identify a group of off-set items of collateral 8252, where each member of the group of off-set items of collateral and at least one of the set of items of collateral share a common attribute. The common attribute may be a category of the item, an age of the item, a condition of the item, a history of the item, an ownership of the item, a caretaker of the item, a security of the item, a condition of an owner of the item, a lien on the item, a storage condition of the item, a geolocation of the item, a jurisdictional location of the item, and the like.

Figure 83:
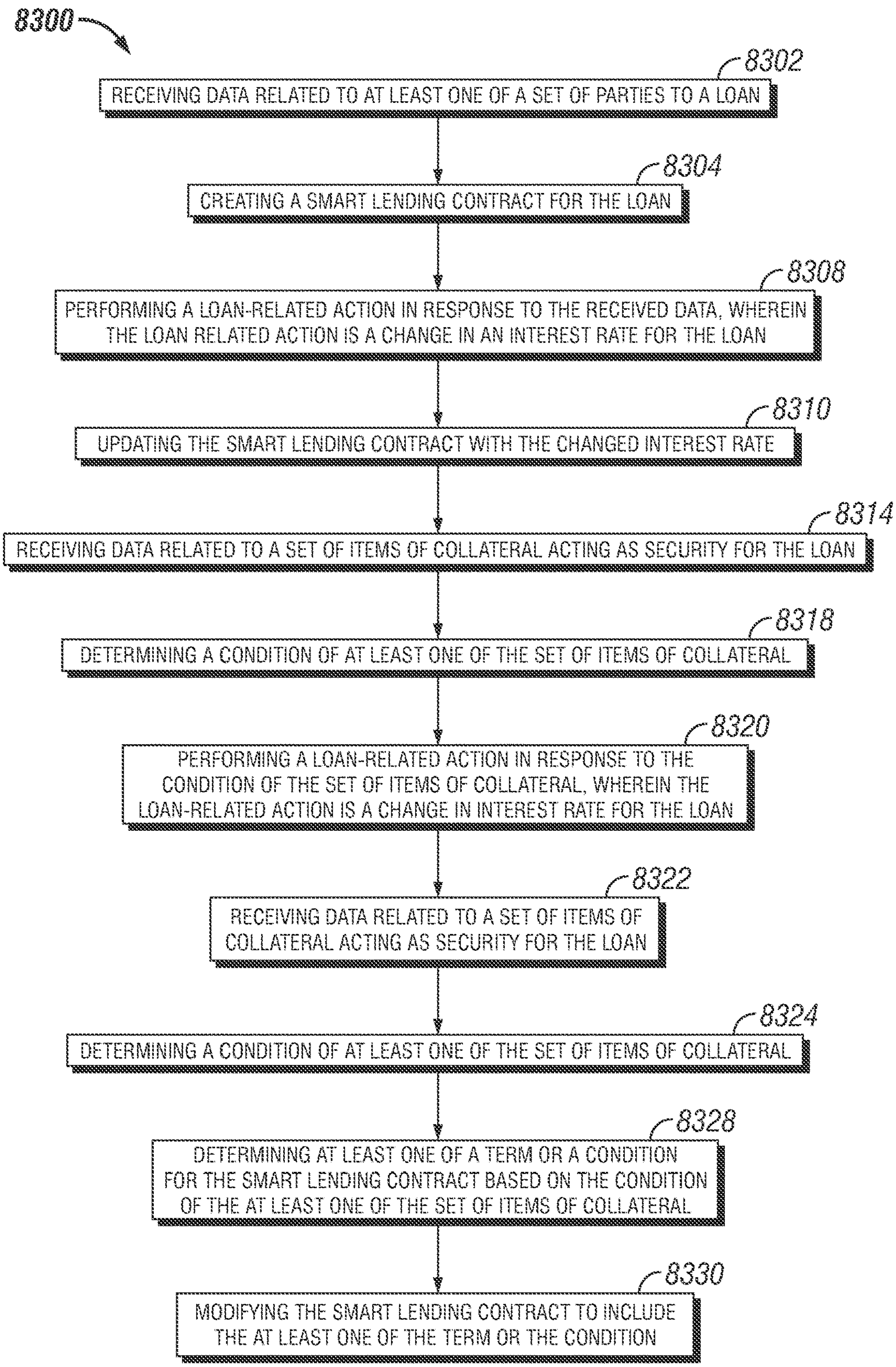
FIG. 83 depicts a method for performing loan related actions.

FIG. 83 depicts a method 8300 including receiving data related to at least one of a set of parties to a loan 8302, creating a smart lending contract for the loan 8304, performing a loan-related action in response to the received data, wherein the loan-related action is a change in an interest rate for the loan 8308, and updating the smart lending contract with the changed interest rate 8310. The method may further include receiving data related to a set of items of collateral acting as security for the loan 8314, determining a condition of the set of items of collateral 8318, and performing a loan-related action in response to the condition of the set of items of collateral, where the loan-related action may be a change in interest rate for the loan 8320. The method may further include receiving data related to a set of items of collateral acting as security for the loan 8322, determining a condition of at least one of the set of items of collateral 8324, determining a term or a condition for the smart lending contract based on the condition of the at least one of the set of items of collateral 8328, and modifying the smart lending contract to include the term or the condition 8330. The method may include identifying a group of off-set items of collateral wherein each member of the group of off-set items of collateral and at least one of the set of items of collateral share a common attribute and monitoring the group of offset items of collateral in a public marketplace, and further may report the monitored data. The method may include changing, such as based on the monitored group of off-set items of collateral, the interest rate of the loan secured by at least one of the set of items of collateral.

Figure 84:
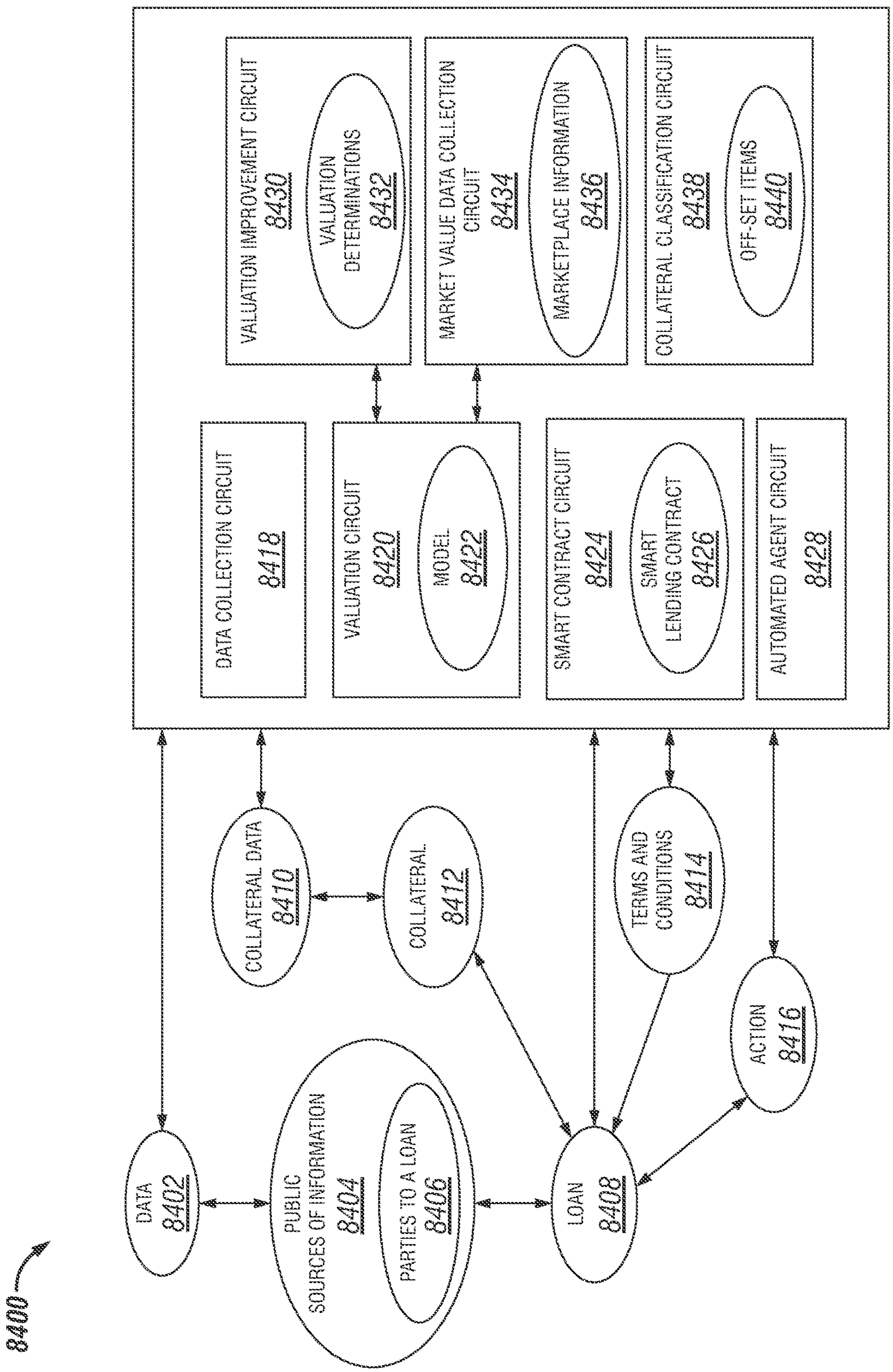
FIG. 84 depicts a system for adaptive intelligence and robotic process.

FIG. 84 depicts a system 8400 including a data collection circuit 8418 structured to acquire data 8402 from public sources of information 8404 (e.g., a website, a news article, a social network, crowdsourced information, and the like) related to at least one party of a set of parties 8406 to a loan 8408 (e.g., primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like). The data collection circuit may be further structured to receive collateral-related data 8410 related to a set of items of collateral 8412 acting as security for the loan and to determine a condition of at least one of the set of items of collateral, wherein the change in the interest rate is further based on the condition of the at least one of the set of items of collateral. The acquired data may include a financial condition of the at least one party of the set of parties to the loan. The financial condition may be determined based on at least one attribute of the at least one party of the set of parties to the loan, the attribute selected from among the list of attributes consisting of: a publicly stated valuation of the party, a set of property owned by the party as indicated by public records, a valuation of a set of property owned by the party, a bankruptcy condition of the party, a foreclosure status of the party, a contractual default status of the party, a regulatory violation status of the party, a criminal status of the party, an export controls status of the party, an embargo status of the party, a tariff status of the party, a tax status of the party, a credit report of the party, a credit rating of the party, a website rating of the party, a set of customer reviews for a product of the party, a social network rating of the party, a set of credentials of the party, a set of referrals of the party, a set of testimonials for the party, a set of behavior of the party, a location of the party, a geolocation of the party, a judicial location of the party, and the like. The system may include a smart contract circuit 8424 structured to create a smart lending contract 8426 for the loan 8408. The smart contract circuit may be structured to specify terms and conditions in the smart lending contract, wherein one of a term or a condition in the smart lending contract governs one of loan-related events or loan-related activities. The system may include an automated agent circuit 8428 structured to automatically perform a loan-related action 8416 in response to the acquired data, wherein the loan-related action is a change in an interest rate for the loan, and wherein the smart contract circuit is further structured to update the smart lending contract with the changed interest rate. The automated agent circuit may be structured to identify an event relevant to the loan (e.g., a value of the loan, a condition of collateral of the loan, or an ownership of collateral of the loan), based, at least in part, on the received data. The automated agent circuit may be structured to perform, in response to the event relevant to the loan, an action selected from the list of actions, such as offering the loan, accepting the loan, underwriting the loan, setting an interest rate for the loan, deferring a payment requirement, modifying an interest rate for the loan, validating title for at least one of the set of items of collateral, assessing the value of at least one of the set of items of collateral, initiating inspection of at least one of the set of items of collateral, setting or modifying terms and conditions 8414 for the loan (e.g., a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, and a consequence of default), providing a notice to one of the parties, providing a required notice to a borrower of the loan, foreclosing on a property subject to the loan, and the like. The loan may include a loan type, such as an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like. The acquired data may be related to the set of items of collateral such as a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, an item of personal property, and the like. The system may include a valuation circuit 8420 structured to determine, based on the acquired data and a valuation model 8422, a value for at least one of the set of items of collateral. The valuation circuit may include a valuation model improvement circuit 8430, where the valuation model improvement circuit modifies the valuation model based on a first set of valuation determinations 8432 for a first set of items of collateral and a corresponding set of loan outcomes having the first set of items of collateral as security. The valuation model improvement circuit may include a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system including at least two of the foregoing, and the like. The smart contract circuit may be further structured to determine a term or a condition for the smart lending contract based on the value for the at least one of the set of items of collateral and modify the smart lending contract to include the term or the condition, modify a term or condition of the loan based on the marketplace information for offset items of collateral relevant to the value of the item of collateral, and the like. The system may include a collateral classification circuit 8438 structured to identify a group of off-set items of collateral, wherein each member of the group of off-set items 8440 of collateral and at least one of the set of items of collateral share a common attribute (e.g., a category of the item, an age of the item, a condition of the item, a history of the item, an ownership of the item, a caretaker of the item, a security of the item, a condition of an owner of the item, a lien on the item, a storage condition of the item, a geolocation of the item, a jurisdictional location of the item, and the like). The valuation circuit may further include a market value data collection circuit 8434 structured to monitor and report marketplace information 8436 for offset items of collateral relevant to the value of the item of collateral, monitor pricing or financial data for the offset items of collateral in a public marketplace, and the like, and report the monitored pricing or financial data.

Figure 85:
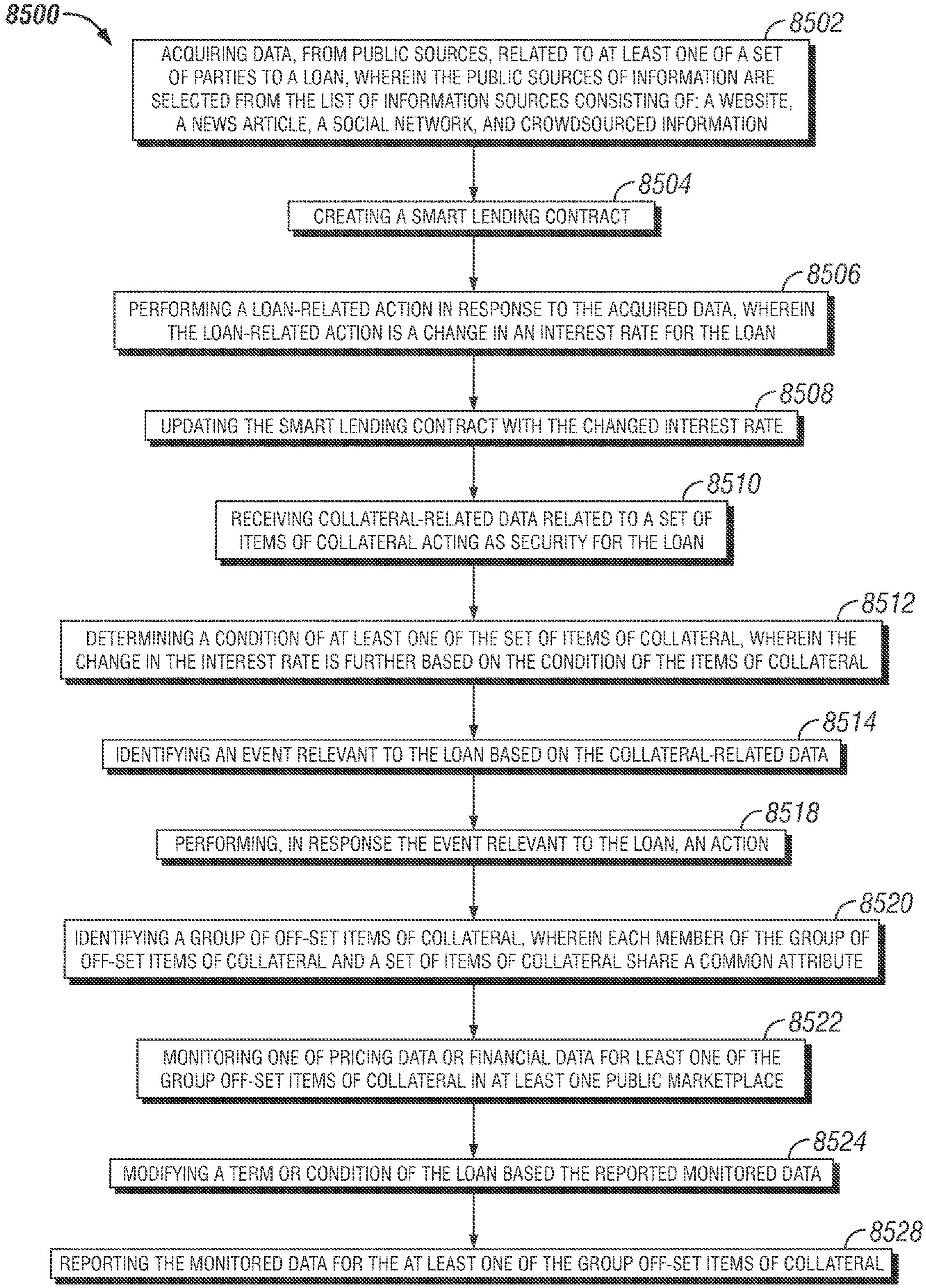
FIG. 85 depicts a method for performing loan related actions.

FIG. 85 depicts a method 8500 including acquiring data, from public sources, related to at least one of a set of parties to a loan, where the public sources of information may be selected from the list of information sources consisting of a website, a news article, a social network, and crowdsourced information 8502. The method may include creating a smart lending contract 8504. The method may include performing a loan-related action in response to the acquired data, wherein the loan-related action is a change in an interest rate for the loan 8506. The method may include updating the smart lending contract with the changed interest rate 8508. The method may include receiving collateral-related data related to a set of items of collateral acting as security for the loan 8510 and determining a condition of at least one of the set of items of collateral, wherein the change in the interest rate is further based on the condition of the at least one of the set of items of collateral 8512. The method may include identifying an event relevant to the loan based, at least in part, on the collateral-related data 8514 and performing, in response the event relevant to the loan, an action 8518, such as offering the loan, accepting the loan, underwriting the loan, setting an interest rate for the loan, deferring a payment requirement, modifying an interest rate for the loan, validating title for at least one of the set of items of collateral, assessing a value of at least one of the set of items of collateral, initiating inspection of at least one of the set of items of collateral, setting or modifying terms and conditions for the loan, providing a notice to one of the parties, providing a required notice to a borrower of the loan, foreclosing on a property subject to the loan, and the like. The method may include determining, based on at least one of the collateral-related data or the acquired data and a valuation model, a value for at least one of the set of items of collateral. The method may include determining at least one of a term or a condition for the smart lending contract based on the value for the at least one of the set of items of collateral. The method may include modifying the smart lending contract to include the at least one of the term or the condition. The method may include modifying the valuation model based on a first set of valuation determinations for a first set of items of collateral and a corresponding set of loan outcomes having the first set of items of collateral as security. The method may include identifying a group of off-set items of collateral, wherein each member of the group of off-set items of collateral and at least one of the set of items of collateral share a common attribute 8520, monitoring one of pricing data or financial data for least one of the group off-set items of collateral in at least one public marketplace 8522, reporting the monitored data for the at least one of the group off-set items of collateral 8524, and modifying a term or condition of the loan based the reported monitored data 8528

Figure 86:
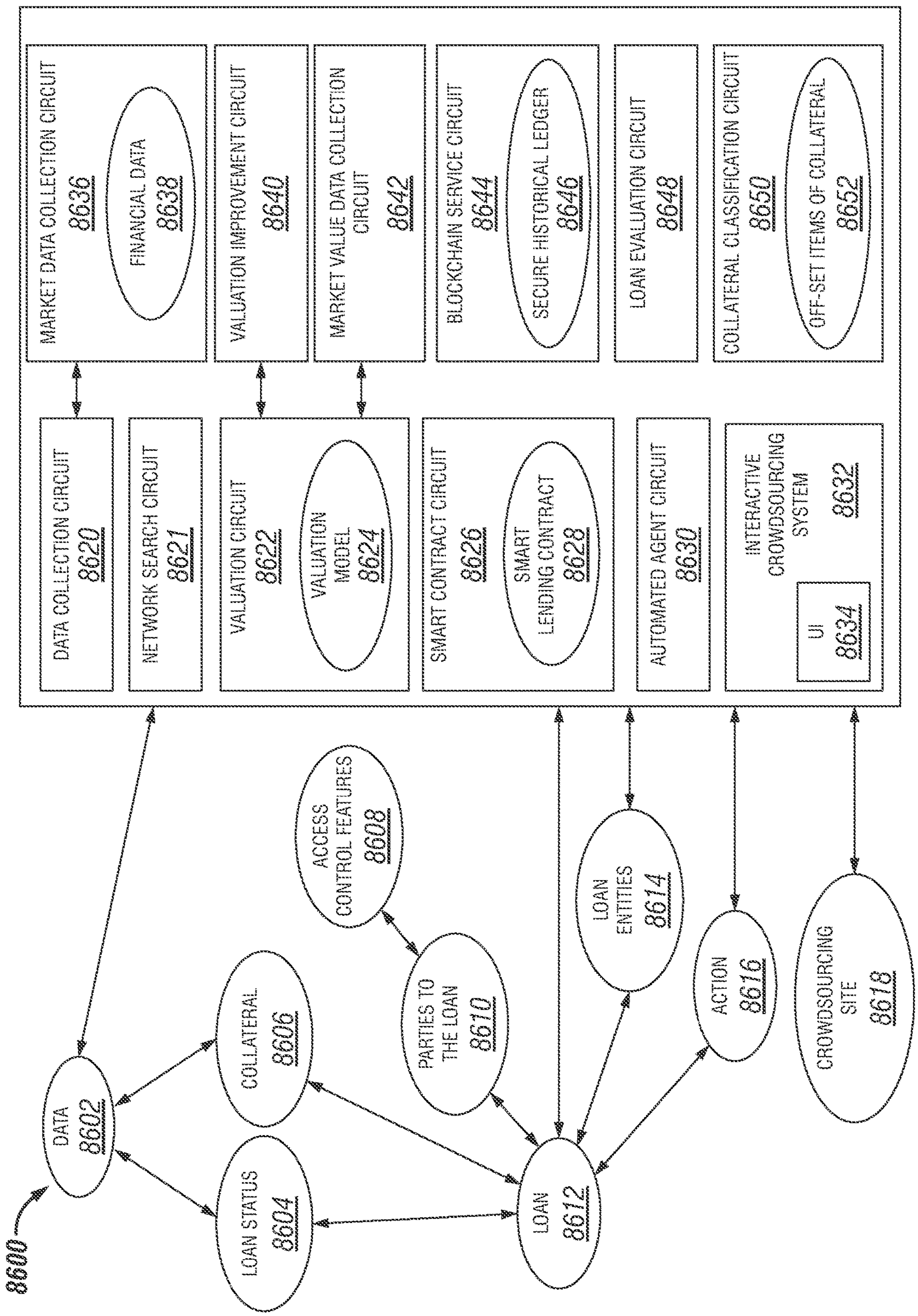
FIG. 86 depicts a system for adaptive intelligence and robotic process.

FIG. 86 depicts a system 8600 including a data collection circuit 8620 structured to receive data 8602 relating to a status 8604 of a loan 8612 and data relating to a set of items of collateral 8606 acting as security for the loan. The data collection circuit may monitor one or more of the loan entities with a system such as an Internet of Things system, a camera system, a networked monitoring system, an internet monitoring system, a mobile device system, a wearable device system, a user interface system, and an interactive crowdsourcing system 8632. For instance, an interactive crowdsourcing system may include a user interface 8634, the user interface configured to solicit information related to one or more of the loan entities from a crowdsourcing site 8618, and where the user interface is structured to allow one or more of the loan entities to input information on one or more of the loan entities. In another instance, a networked monitoring system may include a network search circuit 8621 structured to search publicly available information sites for information related to one or more of the loan entities. The system may include a blockchain service circuit 8644 structured to maintain a secure historical ledger 8646 of events related to the loan, such as to interpret a plurality of access control features 8608 corresponding to a plurality of parties 8610 associated with the loan. The system may include a loan evaluation circuit 8648 structured to determine a loan status based on the received data. The data collection circuit may receive data related to one or more loan entities 8614, where the loan evaluation circuit may determine compliance with a covenant based on the data related to the one or more of the loan entities. The loan evaluation circuit may be structured to determine a state of performance for a condition of the loan based on the received data and a status of the one or more of the loan entities, and wherein the determination of the loan status is determined based in part on the status of the at least one or more of the loan entities and the state of performance of the condition for the loan. For instance, the condition of the loan may relate to at least one of a payment performance and a satisfaction on a covenant. The data collection circuit may include a market data collection circuit 8636 structured to receive financial data 8638 regarding at least one of the plurality of parties associated with the loan. The loan evaluation circuit may be structured to determine a financial condition of the at least one of the plurality of parties associated with the loan based on the received financial data, where the at least one of the plurality of parties may be a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, an accountant, and the like. The received financial data may relate to an attribute of the entity for one of the plurality of parties, such as a publicly stated valuation of the party, a set of property owned by the party as indicated by public records, a valuation of a set of property owned by the party, a bankruptcy condition of the party, a foreclosure status of the entity, a contractual default status of the entity, a regulatory violation status of the entity, a criminal status of the entity, an export controls status of the entity, an embargo status of the entity, a tariff status of the entity, a tax status of the entity, a credit report of the entity, a credit rating of the entity, a website rating of the entity, a set of customer reviews for a product of the entity, a social network rating of the entity, a set of credentials of the entity, a set of referrals of the entity, a set of testimonials for the entity, a set of behavior of the entity, a location of the entity, a geolocation of the entity, and the like. The system may include a smart contract circuit 8626 structured to create a smart lending contract 8628 for the loan. The smart contract circuit may be structured to determine a term or a condition for the smart lending contract based on the value for the at least one of the set of items of collateral and modify the smart lending contract to include the term or the condition, where the terms and conditions may be a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, a consequence of default, and the like. The system may include an automated agent circuit 8630 structured to perform a loan-action 8616 based on the loan status, where the blockchain service circuit may be structured to update the historical ledger of events with the loan action. The system may include a valuation circuit 8622 structured to determine, based on the received data and a valuation model 8624, a value for at least one of the set of items of collateral. The valuation circuit may include a valuation model improvement circuit 8640, where the valuation model improvement circuit modifies the valuation model based on a first set of valuation determinations for a first set of items of collateral and a corresponding set of loan outcomes having the first set of items of collateral as security. The valuation model improvement circuit may include a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system. The valuation circuit may include a market value data collection circuit 8642 structured to monitor and report marketplace information for offset items of collateral relevant to the value of the item of collateral. The market value data collection circuit may be further structured to monitor pricing or financial data for the offset items of collateral in a public marketplace, such as to report the monitored pricing or financial data. The smart contract circuit may be further structured to modify a term or condition of the loan based on the marketplace information for offset items of collateral relevant to the value of the item of collateral. The system may include a collateral classification circuit 8650 structured to identify a group of off-set items of collateral 8652, where each member of the group of off-set items of collateral and at least one of the set of items of collateral may share a common attribute. The common attribute may be a category of the item of collateral, an age of the item of collateral, a condition of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a geolocation of the item of collateral, a jurisdictional location of the item of collateral, and the like.

Figure 87:
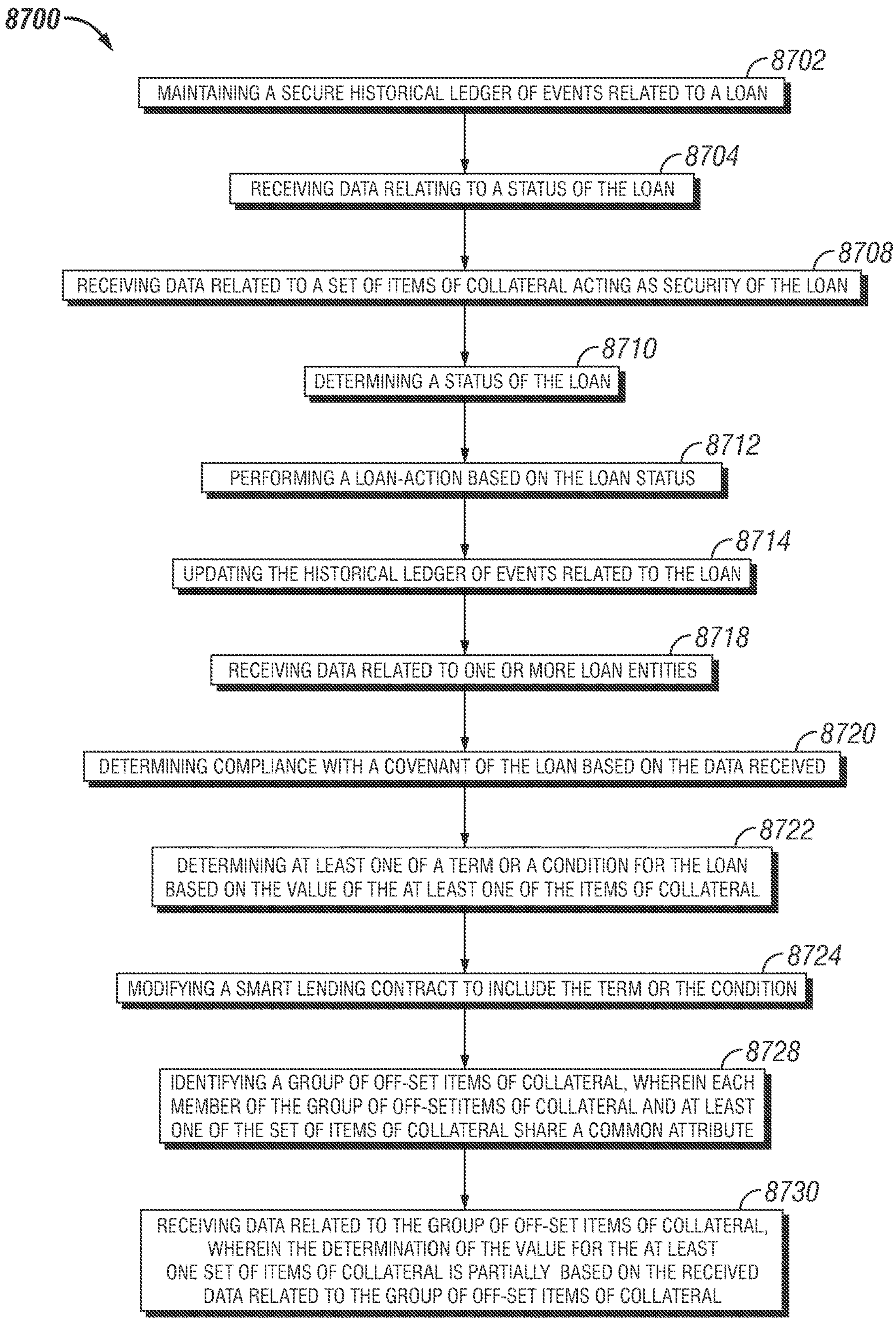
FIG. 87 depicts a method for performing loan related actions.

FIG. 87 depicts a method 8700 including maintaining a secure historical ledger of events related to a loan 8702, receiving data relating to a status of the loan 8704, receiving data related to a set of items of collateral acting as security of the loan 8708, determining a status of the loan 8710, performing a loan-action based on the loan status 8712, and updating the historical ledger of events related to the loan 8714. The method may further include receiving data related to one or more loan entities 8718 and determining compliance with a covenant of the loan based on the data received 8720. The method may further include determining a state of performance for a condition of the loan, where the determination of the loan status is based on part on the state of performance of the condition of the loan. The method may further include receiving financial data related to at least one party to the loan. The method may further include determining a financial condition of the at least one party to the loan based on the financial data. The method may further include determining a value for at least one set of items of collateral based on the received data and a valuation model. The method may further include determining at least one of a term or a condition for the loan based on the value of the at least one of the items of collateral 8722 and modifying a smart lending contract to include the at least one of the term or the condition 8724. The method may include identifying a group of off-set items of collateral, where each member of the group of off-set items of collateral and at least one of the set of items of collateral share a common attribute 8728, receiving data related to the group of off-set items of collateral, wherein the determination of the value for the at least one set of items of collateral is partially based on the received data related to the group of off-set items of collateral 8730.

Figure 88:
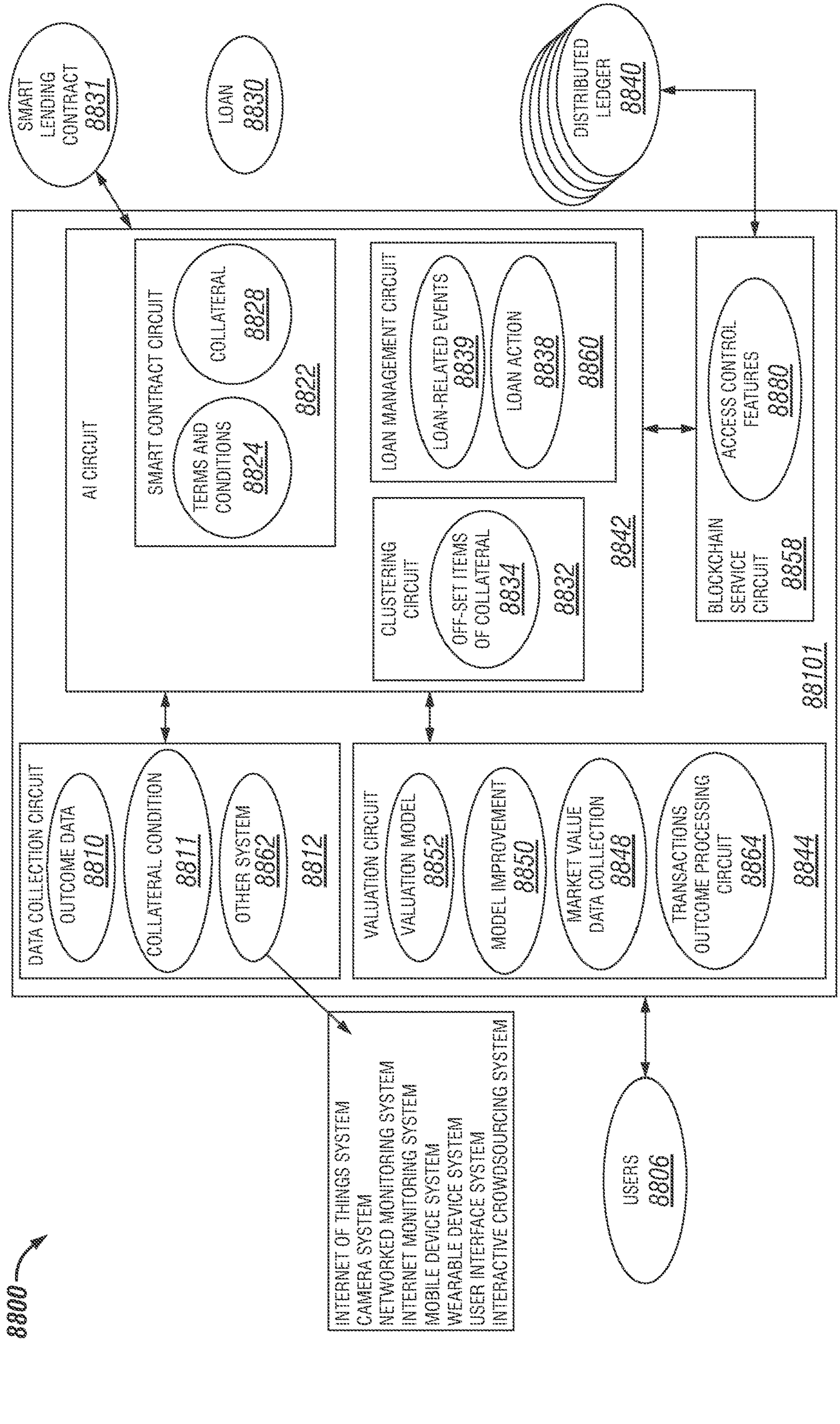
FIG. 88 depicts a smart contract system for managing collateral for a loan.

Referring to FIG. 88, an illustrative and non-limiting example smart contract system for managing collateral for a loan 8800 is depicted. The example system may include a controller 8801. The controller 8801 may include a data collection circuit 8812 structured to monitor a status of a loan 8830 and of a collateral 8828 for the loan, and several artificial intelligence circuits including a smart contract circuit 8822 structured to process information from the data collection circuit 8812 and automatically initiate at least one of a substitution, a removal, or an addition of one or items from the collateral for the loan based on the information and a smart lending contract 8831 in response to at least one of the status of the loan or the status of the collateral for the loan; and a blockchain service circuit 8858 structured to interpret a plurality of access control features 8880 corresponding to at least one party associated with the loan and record the at least one substitution, removal, or addition in a distributed ledger 8840 for the loan. The data collection circuit may further include at least one other system 8862 selected from the systems consisting of: an Internet of Things system, a camera system, a networked monitoring system, an internet monitoring system, a mobile device system, a wearable device system, a user interface system, and an interactive crowdsourcing system.

A status of the loan 8830 may be determined based on the status of at least one of an entity (e.g. user 8806) related to the loan and a state of a performance of a condition for the loan. State of the performance of the condition may relate to at least one of a payment performance or a satisfaction of a covenant for the loan. The status of the loan may be determined based on a status of at least one entity related to the loan and a state of performance of a condition for the loan, and the performance of the condition may relate to at least one of a payment performance or a satisfaction of a covenant for the loan. The data collection circuit 8812 may be further structured to determine compliance with the covenant by monitoring the at least one entity. When the at least one entity is a party to the loan, the data collection circuit 8812 may monitor a financial condition of at least one entity that is a party to the loan. The condition for the loan may include a financial condition for the loan, and wherein the state of performance of the financial condition may be determined based on an attribute selected from the attributes consisting of: a publicly stated valuation of the at least one entity, a property owned by the at least one entity as indicated by public records, a valuation of a property owned by the at least one entity, a bankruptcy condition of the at least one entity, a foreclosure status of the at least one entity, a contractual default status of the at least one entity, a regulatory violation status of the at least one entity, a criminal status of the at least one entity, an export controls status of the at least one entity, an embargo status of the at least one entity, a tariff status of the at least one entity, a tax status of the at least one entity, a credit report of the at least one entity, a credit rating of the at least one entity, a website rating of the at least one entity, a plurality of customer reviews for a product of the at least one entity, a social network rating of the at least one entity, a plurality of credentials of the at least one entity, a plurality of referrals of the at least one entity, a plurality of testimonials for the at least one entity, a behavior of the at least one entity, a location of the at least one entity, a geolocation of the at least one entity, and a relevant jurisdiction for the at least one entity.

The party to the loan may be selected from the parties consisting of: a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, and an accountant.

The data collection circuit 8812 may be further structured to monitor the status of the collateral of the loan based on at least one attribute of the collateral selected from the attributes consisting of: a category of the collateral, an age of the collateral, a condition of the collateral, a history of the collateral, a storage condition of the collateral, and a geolocation of the collateral.

The controller 88101 may include a valuation circuit 8844 which may be structured to use a valuation model 8852 to determine a value for the collateral based on the status of the collateral for the loan. The smart contract circuit 8822 may initiate the at least one substitution, removal, or addition of one or more items from the collateral for the loan to maintain a value of collateral within a predetermined range.

The valuation circuit 8844 may further include a transactions outcome processing circuit 8864 structured to interpret outcome data 8810 relating to a transaction in collateral and iteratively improve 8850 the valuation model in response to the outcome data.

The valuation circuit 8844 may further include a market value data collection circuit 8848 structured to monitor and report on marketplace information relevant to a value of collateral. The market value data collection circuit 8848 may monitor pricing data or financial data for an offset collateral item 8834 in at least one public marketplace.

The market value data collection circuit 8848 is further structured to construct a set of offset collateral items 8834 used to value an item of collateral that may be constructed using a clustering circuit 8832 of the controller 88101 based on an attribute of the collateral. The attributes may be selected from among a category of the collateral, an age of the collateral, a condition of the collateral, a history of the collateral, a storage condition of the collateral, and a geolocation of the collateral.

Terms and conditions 8824 for the loan may include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

The smart contract circuit may further include or be in communication with a loan management circuit 8860 structured to specify terms and conditions of the smart lending contract 8831 that governs at least one of loan terms and conditions, a loan-related event 8839, or a loan-related activity or action 8838.

Figure 89:
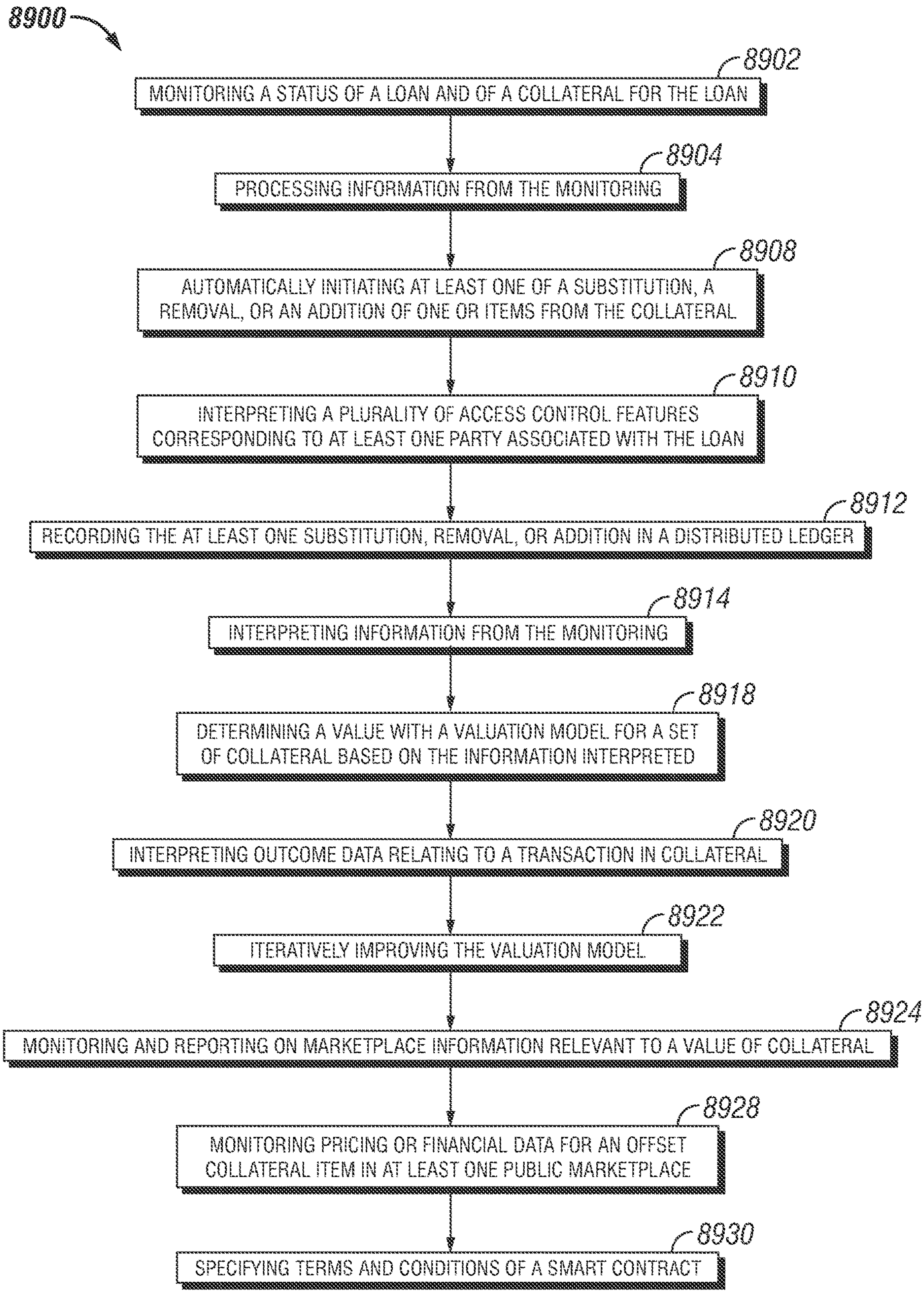
FIG. 89 depicts a smart contract method for managing collateral for a loan.

Referring to FIG. 89, an example smart contract method for managing collateral for a loan is depicted. The example method may include monitoring a status of a loan and of a collateral for the loan (step 8902); automatically initiating at least one of a substitution, a removal, or an addition of one or more items from the collateral for the loan based on the information (step 8908); interpreting a plurality of access control features corresponding to at least one party associated with the loan (step 8910); and recording the at least one substitution, removal, or addition in a distributed ledger for the loan (step 8912). A status of the loan may be determined based on the status of at least one of an entity related to the loan and a state of a performance of a condition for the loan.

The method may further include interpreting information from the monitoring (step 8914) and determining a value with a valuation model for a set of collateral based on at least one of the status of the loan or the collateral for the loan (step 8918). The at least one substitution, removal, or addition may be to maintain a value of collateral within a predetermined range. The method may further include interpreting outcome data relating to a transaction of one of the collateral or an offset collateral (step 8920) and iteratively improving the valuation model in response to the outcome data (step 8922). The method may further include monitoring and reporting on marketplace information relevant to a value of collateral (step 8924).

The method may further include monitoring pricing data or financial data for an offset collateral item in at least one public marketplace (step 8928).

The method may further include specifying terms and conditions of a smart contract that governs at least one of terms and conditions for the loan, a loan-related event, or a loan-related activity (step 8930).

Figure 90:
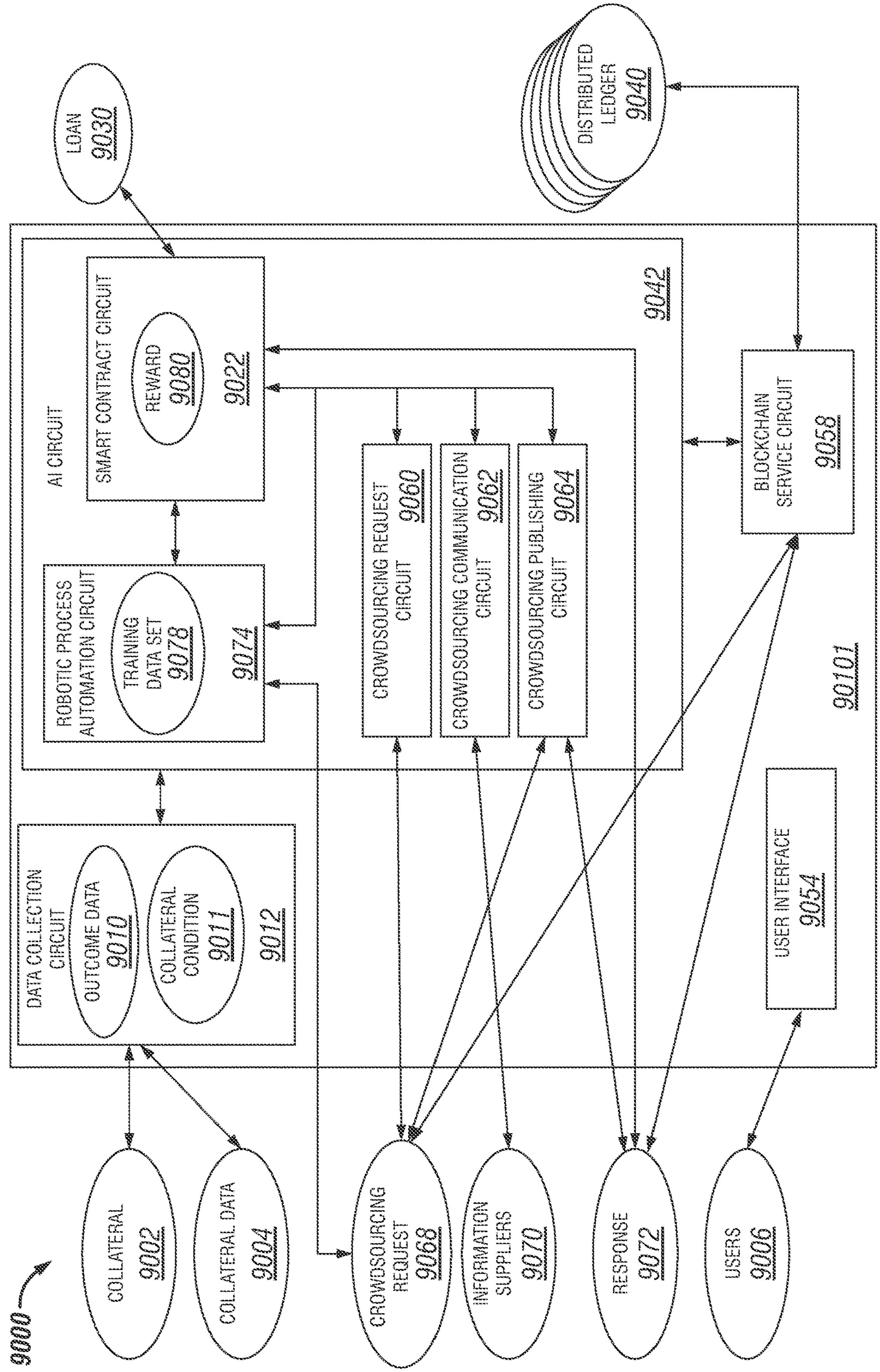
FIG. 90 depicts a system for validating conditions of collateral or a guarantor for a loan.

Referring to FIG. 90, an illustrative and non-limiting example of a crowdsourcing system for validating conditions of collateral or a guarantor for a loan 9000 is depicted. The example system may include a controller 9001. The controller 9001 may include a data collection circuit 9012, a user interface 9054, and several artificial intelligence circuits including a smart contract circuit 9022, robotic process automation circuit 9074, a crowdsourcing request circuit 9060, a crowdsourcing communications circuit 9062, a crowdsourcing publishing circuit 9064, and a blockchain service circuit 9058.

The crowdsourcing request circuit 9060 may be structured to configure at least one parameter of a crowdsourcing request 9068 related to obtaining information 9004 on a condition of a collateral 9011 for a collateral 9002 for a loan 9030 or a condition of a guarantor for the loan 9096. It may also enable a workflow by which a human user enters the at least one parameter to establish the crowdsourcing request. The at least one parameter may include a type of requested information, the reward, and a condition for receiving the reward. The reward may be selected from the rewards consisting of: a financial reward, a token, a ticket, a contractual right, a cryptocurrency, a plurality of reward points, a currency, a discount on a product or service, and an access right.

The crowdsourcing publishing circuit 9064 may be configured to publish the crowdsourcing request 9068 to a group of information suppliers.

The crowdsourcing communications circuit 9062 may be structured to collect and process at least one response 9072 from the group of information suppliers 9070 and to provide a reward 9080 to at least one of the group of information suppliers in response to a successful information supply event 9098.

The crowdsourcing communications circuit 9062 further includes a smart contract circuit 9022 structured to manage the reward 9080 by determining the successful information supply event 9098 in response to the at least one parameter configured for the crowdsourcing request 9068 and to automatically allocate the reward 9080 to the at least one of the groups of information suppliers 9070 in response to the successful information supply event 9098. It may also be structured to process the at least one response 9072 and, in response, automatically undertake an action related to the loan. The action may be at least one of a foreclosure action, a lien administration action, an interest-rate setting action, a default initiation action, a substitution of collateral, or a calling of the loan.

The loan 9030 may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement., a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The crowdsourcing request circuit 9060 may be further structured to configure at least one further parameter of the crowdsourcing request 9068 to obtain information on a condition of a collateral 9011 for the loan.

The collateral 9002 may include at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

The condition of collateral 9011 may be determined based on an attribute selected from the attributes consisting of: a quality of the collateral, a condition of the collateral, a status of a title to the collateral, a status of a possession of the collateral, and a status of a lien on the collateral. When the collateral is an item, the condition may be determined based on an attribute selected from the attributes consisting of: a new or used status of the item, a type of the item, a category of the item, a specification of the item, a product feature set of the item, a model of the item, a brand of the item, a manufacturer of the item, a status of the item, a context of the item, a state of the item, a value of the item, a storage location of the item, a geolocation of the item, an age of the item, a maintenance history of the item, a usage history of the item, an accident history of the item, a fault history of the item, an ownership of the item, an ownership history of the item, a price of a type of the item, a value of a type of the item, an assessment of the item, and a valuation of the item.

The blockchain service circuit 9058 may be structured to record identifying information and the at least one parameter of the crowdsourcing request, the at least one response to the crowdsourcing request, and a reward description in a distributed ledger 9040.

The robotic process automation circuit 9074 may be structured, based on training on a training data set 9078 comprising human user interactions with at least one of the crowdsourcing request circuit or the crowdsourcing communications circuit, to configure the crowdsourcing request based on at least one attribute of the loan. The at least one attribute of the loan may be obtained from a smart contract circuit 9022 that manages the loan. The training data set 9078 may further include outcomes from a plurality of crowdsourcing requests.

The robotic process automation circuit 9074 may be further structured to determine a reward 9080.

The robotic process automation circuit 9074 may be further structured to determine at least one domain to which the crowdsourcing publishing circuit 9064 publishes the crowdsourcing request 9068.

Figure 91:
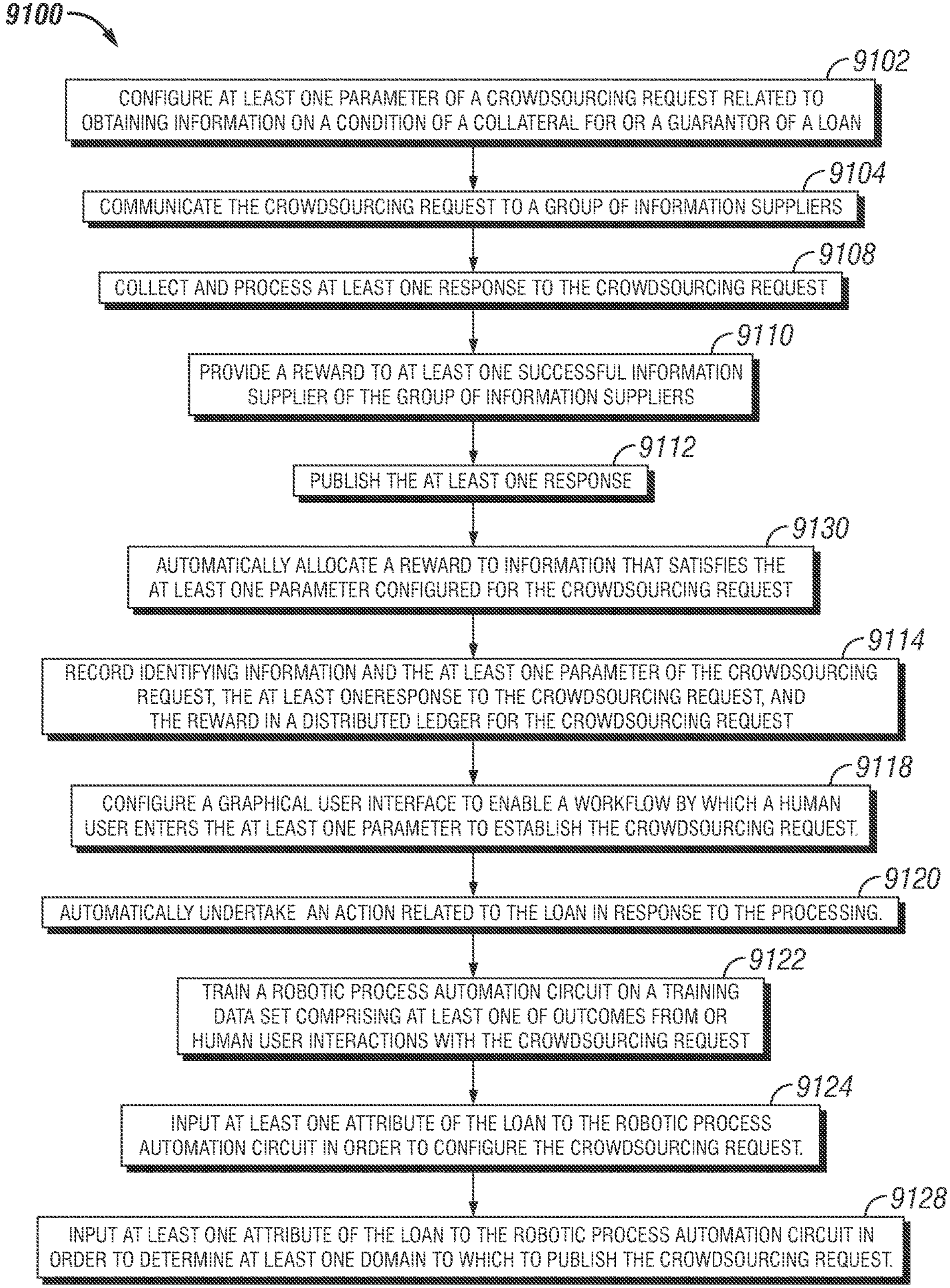
FIG. 91 depicts a crowdsourcing method for validating conditions of collateral or a guarantor for a loan.

Referring to FIG. 91, provided herein is a crowdsourcing method for validating conditions of collateral or a guarantor for a loan. At least one parameter of a crowdsourcing request may be configured to obtain information on a condition of a collateral for a loan or a condition of a guarantor for the loan (step 9102). The crowdsourcing request may be published to a group of information suppliers (step 9104). At least one response to the crowdsourcing request may be collected and processed (step 9108). A reward may be provided to at least one successful information supplier of the group of information suppliers in response to a successful information supply event (step 9110). A reward description may be published to at least a portion of the group of information suppliers in response to the successful information supply event (step 9112). The reward may be automatically allocated to at least one of the group of information suppliers in response to the successful information supply event (step 9130). The method may further include recording identifying information and the at least one parameter of the crowdsourcing request, the at least one response to the crowdsourcing request, and a reward description in a distributed ledger for the crowdsourcing request (step 9114). A graphical user interface may be configured to enable a workflow by which a human user enters the at least one parameter to establish the crowdsourcing request (step 9118). An action related to the loan may be automatically undertaken in response to the successful information supply event (step 9120). A robotic process automation circuit may be trained on a training data set comprising a plurality of outcomes corresponding to a plurality of the crowdsourcing requests and operating the robotic process automation circuit to iteratively improve the crowdsourcing request (step 9122). At least one attribute of the loan may be provided to the robotic process automation circuit in order to configure the crowdsourcing request (step 9124). Configuring the crowdsourcing request may include determining a reward. At least one attribute of the loan may be provided to the robotic process automation circuit in order to determine at least one domain to which to publish the crowdsourcing request (step 9128).

Figure 92:
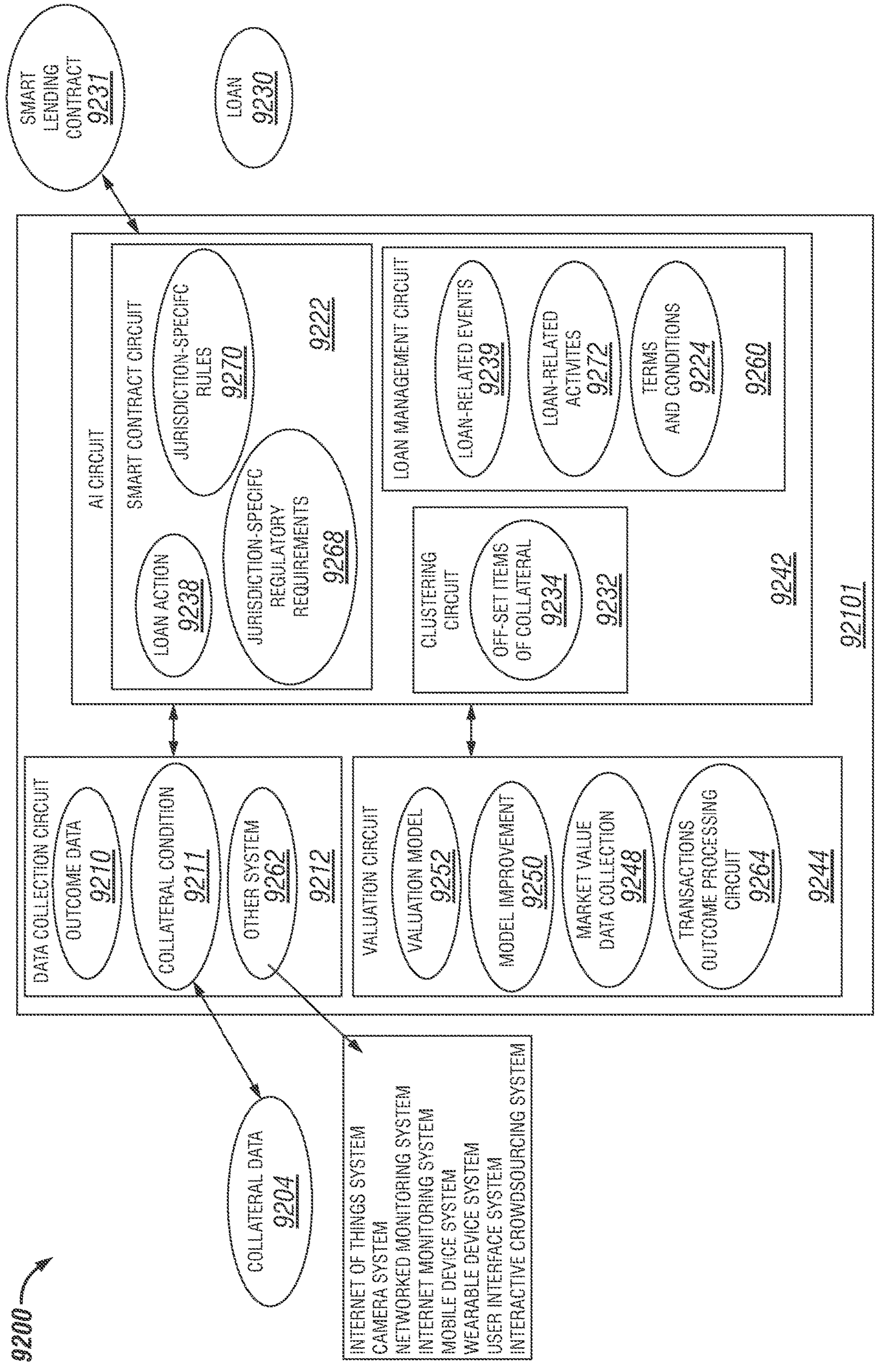
FIG. 92 depicts a smart contract system for modifying a loan.

Referring to FIG. 92, an illustrative and non-limiting example smart contract system for modifying a loan 9200 is depicted. The example system may include a controller 9201. The controller 9201 may include a data collection circuit 9212, a valuation circuit 9244, and several artificial intelligence circuits 9242 including a smart contract circuit 9222, a clustering circuit 9232, a jurisdiction definition circuit 9298, and a loan management circuit 9260. The data collection circuit 9212 may be structured to determine location information corresponding to each one of a plurality of entities involved in a loan. The jurisdiction definition circuit 9298 may be structured to determine a jurisdiction for at least one of the plurality of entities in response to the location information. The smart contract circuit 9222 may be structured to automatically undertake a loan-related action 9238 for the loan based at least in part on the jurisdiction for at least one of the plurality of entities.

The smart contract circuit 9222 may be further structured to automatically undertake the loan-related action in response to a first one of the plurality of entities being in a first jurisdiction, and a second one of the plurality of entities being in a second jurisdiction.

The smart contract circuit 9222 may be further structured to automatically undertake the loan-related action in response to one of the plurality of entities moving from a first jurisdiction to a second jurisdiction.

The loan-related action 9238 may include at least one loan-related action selected from the loan-related actions consisting of: offering the loan, accepting the loan, underwriting the loan, setting an interest rate for the loan, deferring a payment requirement, modifying an interest rate for the loan, validating title for collateral, recording a change in title, assessing a value of collateral, initiating inspection of collateral, calling the loan, closing the loan, setting terms and conditions for the loan, providing notices required to be provided to a borrower, foreclosing on property subject to the loan, and modifying terms and conditions for the loan.

The smart contract circuit 9222 may be further structured to process a plurality of jurisdiction-specific regulatory requirements 9268, such as requirements related to notice, and to provide an appropriate notice to a borrower based on a jurisdiction corresponding to at least one entity selected from the entities consisting of a lender, a borrower, funds provided via the loan, a repayment of the loan, or a collateral for the loan.

The smart contract circuit 9222 may be further structured to process a plurality of jurisdiction-specific regulatory requirements 9268, such as requirement related to foreclosure, and to provide an appropriate foreclosure notice to a borrower based on a jurisdiction of at least one of a lender, a borrower, funds provided via the loan, a repayment of the loan, and a collateral for the loan.

The smart contract circuit 9222 may be further structured to process a plurality of jurisdiction-specific rules 9270 for setting terms and conditions 9224 of the loan and to configure a smart contract 9231 based on a jurisdiction corresponding to at least one entity selected from the entities consisting of: a borrower, funds provided via the loan, a repayment of the loan, and a collateral for the loan.

The smart contract circuit 9222 may be further structured to determine an interest rate for the loan to cause the loan to comply with a maximum interest rate limitation applicable in a jurisdiction corresponding to a selected one of the plurality of entities.

The data collection circuit 9212 may be further structured to monitor a condition of a collateral for the loan, wherein the smart contract circuit is further structured to determine the interest rate for the loan in response to the condition of the collateral for the loan.

The data collection circuit 9212 may be further structured to monitor an attribute of at least one of the plurality of entities that are party to the loan, wherein the smart contract circuit is further structured to determine the interest rate for the loan in response to the attribute.

The smart contract circuit 9222 may further include a loan management circuit 9260 for specifying terms and conditions of smart contracts that govern at least one of loan terms and conditions 9224, loan-related events 9239 or loan-related activities 9272.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring management, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

Terms and conditions for the loan may each include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

The data collection circuit 9212 may further include at least one other system 9262 selected from the systems consisting of: an Internet of Things system, a camera system, a networked monitoring system, an internet monitoring system, a mobile device system, a wearable device system, a user interface system, and an interactive crowdsourcing system.

The valuation circuit 9244 may be structured to use a valuation model 9252 to determine a value for a collateral for the loan based on the jurisdiction corresponding to at least one of the plurality of entities. The valuation model 9252 may be a jurisdiction-specific valuation model, and wherein the jurisdiction corresponding to at least one of the plurality of entities comprises a jurisdiction corresponding to at least one entity selected from the entities consisting of: a lender, a borrower, funds provided pursuant to the loan, a delivery location of funds provided pursuant to the loan, a payment of the loan, and a collateral for the loan.

At least one of the terms and conditions for the loan may be based on the value of the collateral for the loan.

The collateral may include at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

The valuation circuit 9244 may further include a transactions outcome processing circuit 9264 structured to interpret outcome data relating to a transaction in collateral and iteratively improve 9250 the valuation model in response to the outcome data.

The valuation circuit 9244 may further include a market value data collection circuit 9248 structured to monitor and report on marketplace information relevant to a value of collateral. The market value data collection circuit may monitor pricing or financial data for an offset collateral item in at least one public marketplace. A set of offset collateral items 9234 for valuing an item of collateral may be constructed using the clustering circuit 9232 based on an attribute of the collateral. The attribute may be selected from among a category of the collateral, an age of the collateral, a condition of the collateral, a history of the collateral, a storage condition of the collateral, and a geolocation of the collateral.

Figure 93:
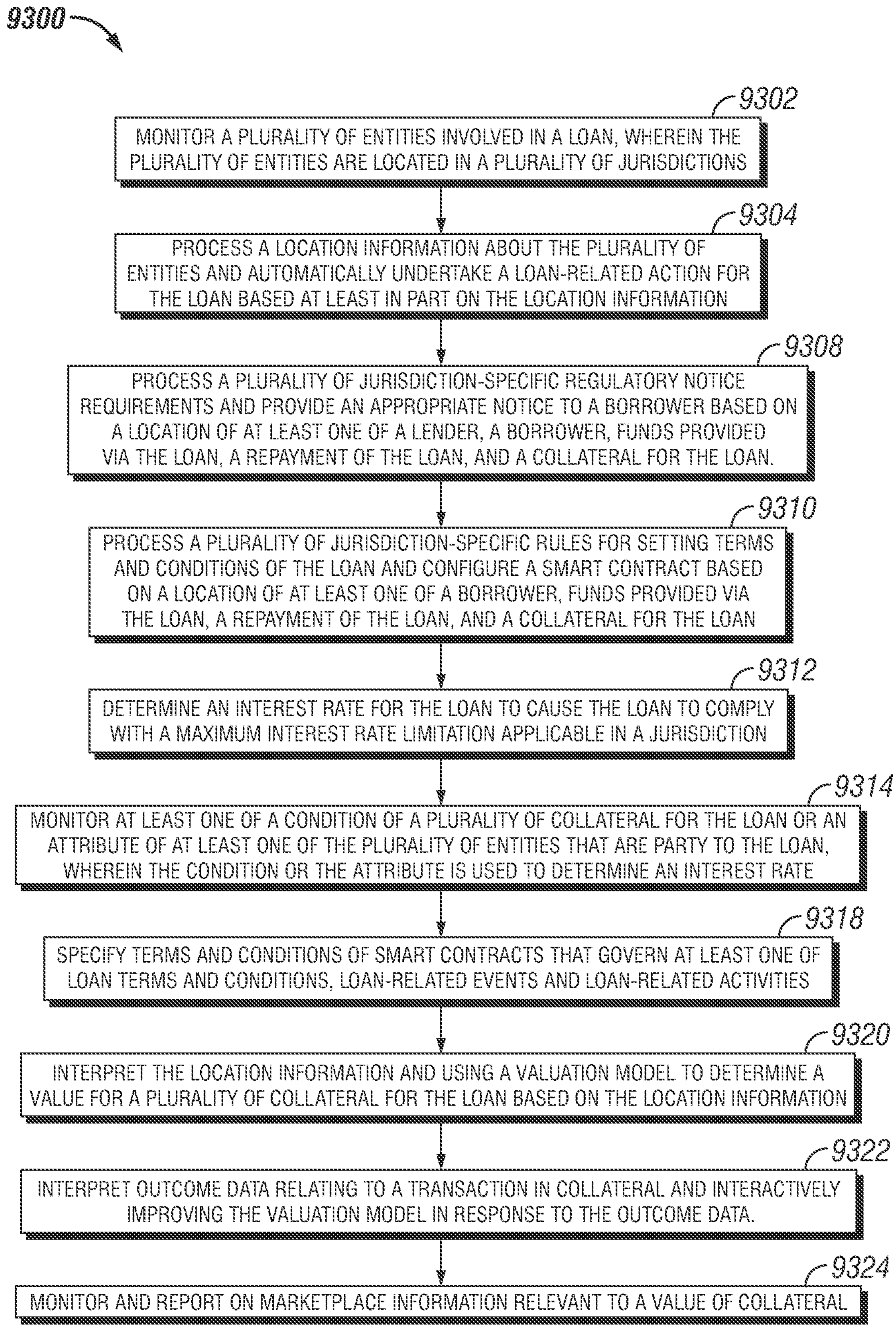
FIG. 93 depicts a smart contract method for modifying a loan.

Referring to FIG. 93, provided herein is a smart contract method 9300 for modifying a loan. An example method may include monitoring location information corresponding to each one of a plurality of entities involved in a loan (step 9302); processing a location information about the entities and automatically undertaking a loan-related action for the loan based at least in part on the location information (step 9304). The example method includes processing a number of jurisdiction-specific regulatory notice requirements and providing an appropriate notice to a borrower based on a location of the lender, a borrower, funds provided via the loan, a repayment of the loan, and/or a collateral for the loan (step 9308). The example method includes processing a number of jurisdiction-specific rules for setting terms and conditions of the loan and configuring a smart contract based on a location of the lender, a borrower, funds provided via the loan, a repayment of the loan, and/or a collateral for the loan (step 9310). The example method further includes determining an interest rate of the loan to cause the loan to comply with a maximum interest rate limitation applicable in a jurisdiction (step 9312). The example method includes monitoring at least one of a condition of a number of collateral items for the loan or an attribute of one of the entities that are a party to the loan, where the condition or the attribute is used to determine an interest rate (step 9314). The example method includes specifying terms and conditions of smart contract(s) that govern at least one of the terms and conditions, loan-related events, or loan-related activities (step 9318). The example method includes interpreting the location information and using a valuation model to determine a value for a number of collateral items for the loan based on the location information (step 9320). The example method includes interpreting outcome data relating to a transaction in collateral and iteratively improving the valuation model in response to the outcome data (step 9322). The example method includes monitoring and reporting on marketplace information relevant to a value of collateral (step 9324).

A plurality of jurisdiction-specific requirements based on a jurisdiction of a relevant one of the plurality of entities may be processed and performing at least one operation may be selected from the operations consisting of: providing an appropriate notice to a borrower in response to the plurality of jurisdiction-specific requirements comprising regulatory notice requirements; setting specific rules for setting terms and conditions of the loan in response to the plurality of jurisdiction-specific requirements comprising jurisdiction-specific rules for terms and conditions of the loan; determining an interest rate for the loan to cause the loan to comply with a maximum interest rate limitation in response to the plurality of jurisdiction-specific requirements comprising a maximum interest rate limitation; and wherein the relevant one of the plurality of entities comprises at least one entity selected from the entities consisting of: a lender, a borrower, funds provided pursuant to the loan, a repayment of the loan, and a collateral for the loan (step 9308).

At least one of a condition of a plurality of collateral for the loan or an attribute of at least one of the plurality of entities that are party to the loan may be monitored, wherein the condition or the attribute is used to determine an interest rate (step 9314).

A valuation model may be operated to determine a value for a collateral for the loan based on the jurisdiction for at least one of the plurality of entities (step 9320).

Outcome data relating to a transaction in collateral may be interpreted and the valuation model may be iteratively improved in response to the outcome data (step 9322).

Figure 94:
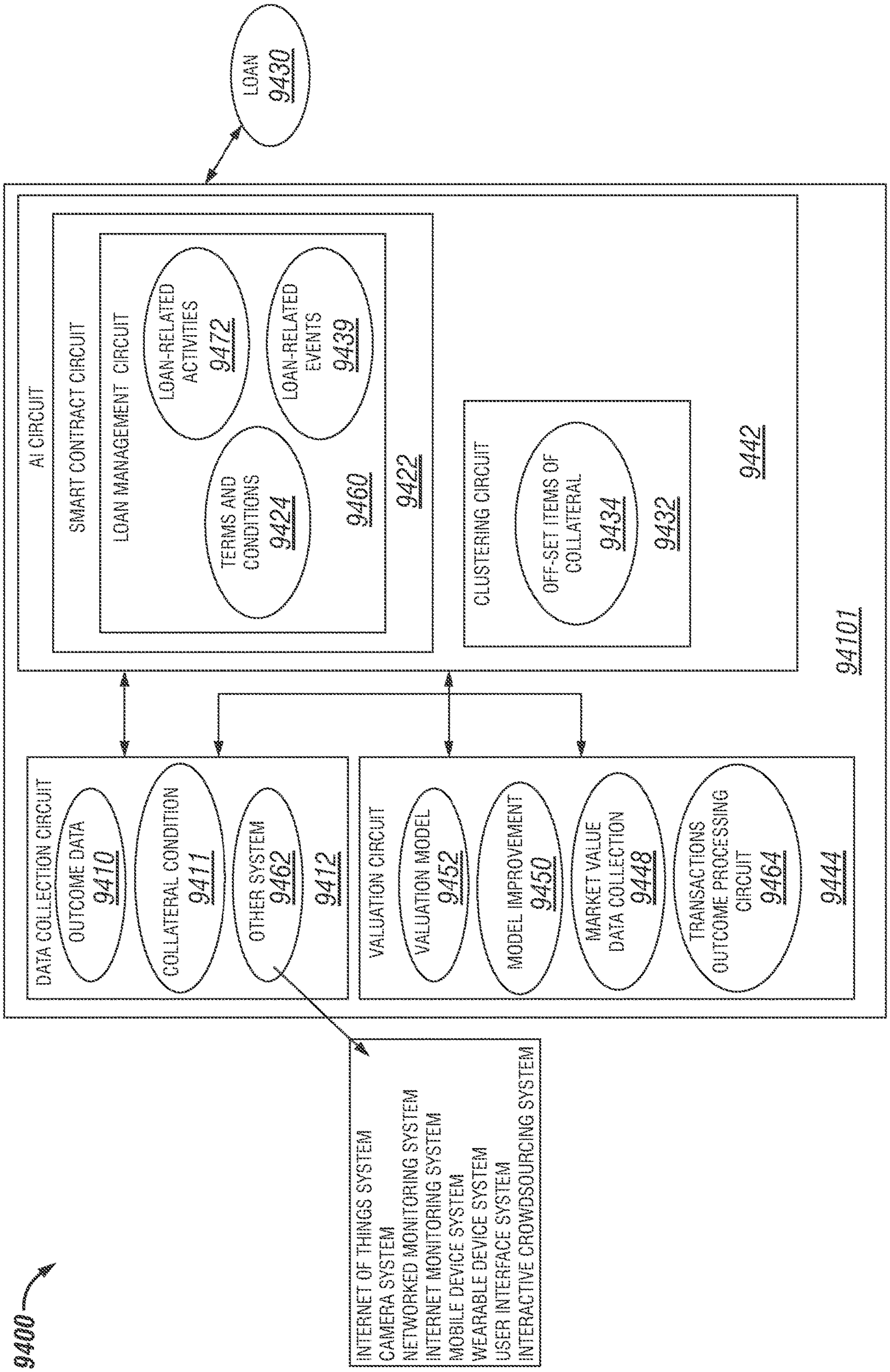
FIG. 94 depicts a smart contract system for modifying a loan.

Referring now to FIG. 94, an illustrative and non-limiting example smart contract system for modifying a loan 9400 is depicted. The example system may include a controller 9401. The controller 94101 may include a data collection circuit 9412, a valuation circuit 9444, and several artificial intelligence circuits 9442 including a smart contract circuit 9422, a clustering circuit 9432, and a loan management circuit 9460.

The data collection circuit 9412 may be structured to monitor and collect information about at least one entity 9498 involved in a loan 9430. The smart contract circuit 9422 may be structured to automatically restructure a debt related to the loan based on the monitored and collected information about the at least one entity involved in the loan. The monitored and collected information may include a condition of a collateral 9411 for the loan, or according to at least one rule that is based on a covenant of the loan and wherein the restructuring occurs upon an event that is determined with respect to the at least one entity that relates to the covenant, or restructuring may be based on an attribute 9494 of the at least one entity that is monitored by the data collection circuit. The event may be a failure of collateral for the loan to exceed a required fractional value of a remaining balance of the loan or a default of a buyer with respect to the covenant.

The smart contract circuit 9422 may be further structured to determine the occurrence of an event based on a covenant of the loan and the monitored and collected information about the at least one entity involved in the loan and to automatically restructure the debt in response to the occurrence of the event.

The smart contract circuit 9422 may further include a loan management circuit 9460 which may be structured to specify terms and conditions of a smart contract that governs at least one of loan terms and conditions 9424, a loan-related event 9439, or a loan-related activity 9472.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

Terms and conditions for the loan may include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

The data collection circuit 9412 may further include at least one other system 9462 selected from the systems consisting of: an Internet of Things system, a camera system, a networked monitoring system, an internet monitoring system, a mobile device system, a wearable device system, a user interface system, and an interactive crowdsourcing system.

The valuation circuit 9444 may be structured to use a valuation model 9452 to determine a value for a collateral based on the monitored and collected information about the at least one entity involved in the loan. The smart contract circuit may be further structured to automatically restructure the debt based on the value for the collateral.

The collateral may be at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

The valuation circuit 9444 may further include a transactions outcome processing circuit 9464 structured to interpret outcome data 9410 relating to a transaction in collateral and iteratively improve 9450 the valuation model in response to the outcome data.

The valuation circuit 9444 may further include a market value data collection circuit 9448 structured to monitor and report on marketplace information relevant to a value of collateral. The market value data collection circuit 9448 monitors pricing or financial data for an offset collateral item 9434 in at least one public marketplace. A set of offset collateral items 9434 for valuing an item of collateral may be constructed using a clustering circuit 9432 based on an attribute of the collateral. The attribute may be selected from among a category of the collateral, an age of the collateral, a condition of the collateral, a history of the collateral, a storage condition of the collateral, and a geolocation of the collateral.

Figure 95:
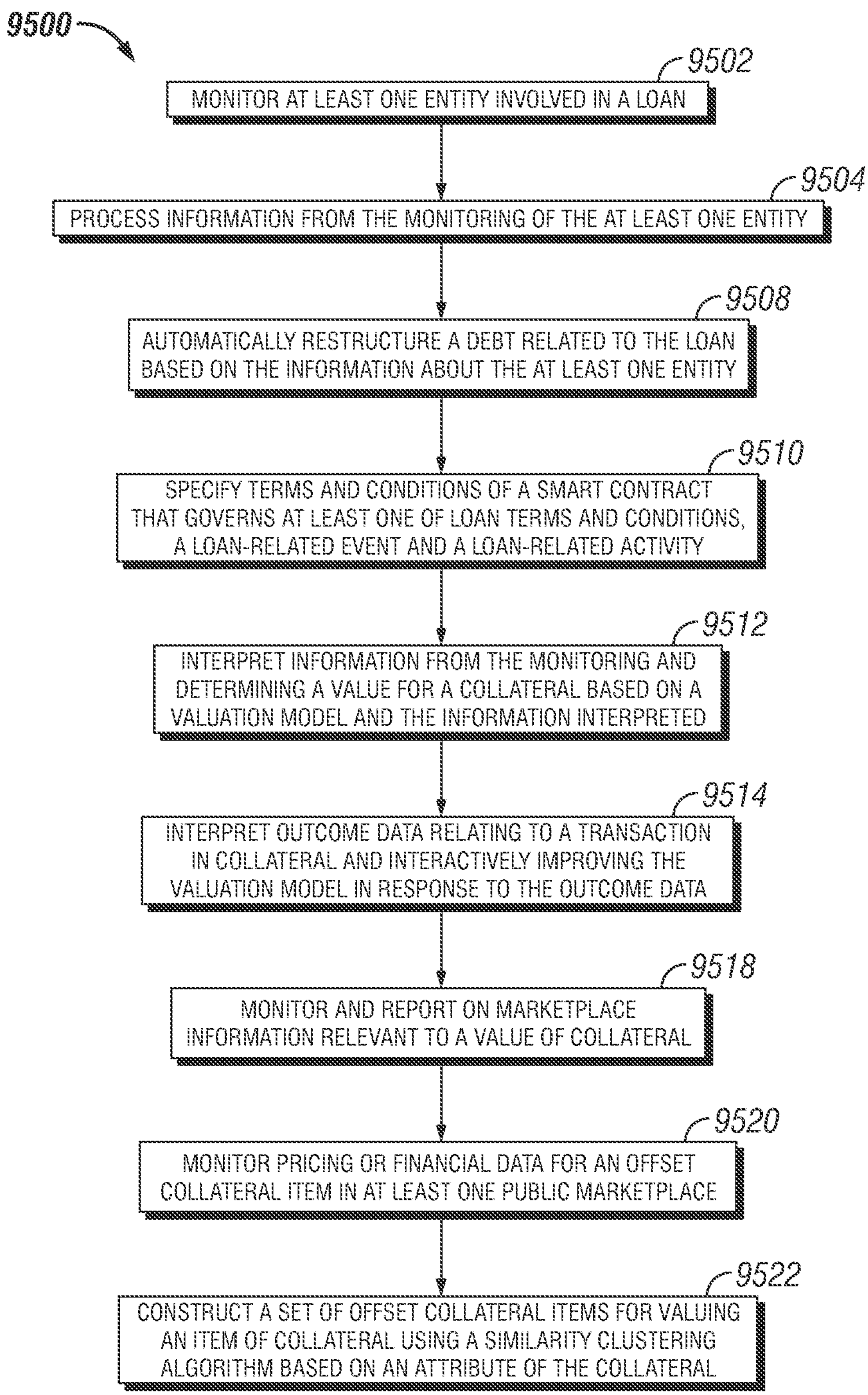
FIG. 95 depicts a smart contract method for modifying a loan.

Referring now to FIG. 95, an illustrative and non-limiting example smart contract method for modifying a loan 9500 is depicted. The method includes monitoring and collecting information about at least one entity involved in a loan (step 9502); processing information from the monitoring of the at least one entity (step 9504); and automatically restructuring a debt related to the loan based on the monitored and collected information about the at least one entity (step 9508). Determining the occurrence of an event may be based on a covenant of the loan and the monitored and collected information about the at least one entity involved in the loan and automatically restructuring the debt in response to the occurrence of the event (step 9509).

Terms and conditions of a smart contract that governs at least one of loan terms and conditions, a loan-related event, and a loan-related activity may be specified (step 9510). Operating a valuation model to determine a value for a collateral based on the monitored and collected information about the at least one entity involved in the loan may be performed (step 9512). Outcome data relating to a transaction in collateral may be interpreted and the valuation model may be iteratively improved in response to the outcome data (step 9514). The method may further include monitoring and reporting on marketplace information relevant to a value of collateral (step 9518). Pricing or financial data for an offset collateral item may be monitored in at least one public marketplace (step 9520). A set of offset collateral items for valuing an item of collateral may be constructed using a similarity clustering algorithm based on an attribute of the collateral (step 9522).

Figure 96:
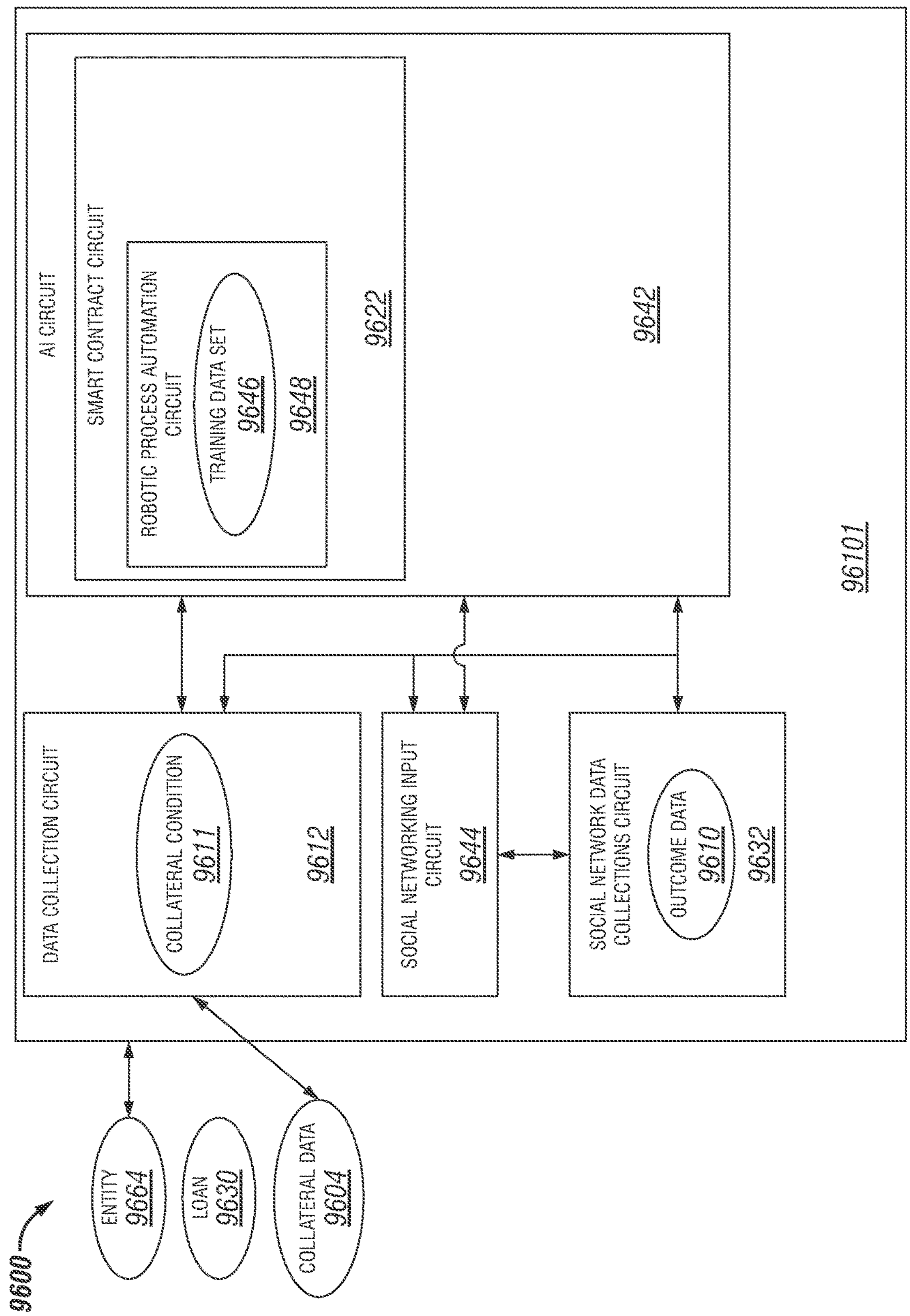
FIG. 96 depicts a smart contract system for modifying a loan.

Referring now to FIG. 96, an illustrative and non-limiting example smart contract system for modifying a loan 9600 is depicted. The example system may include a controller 9601. The controller 9601 may include a data collection circuit 9612, a social networking input circuit 9644, a social network data collection circuit 9632, and several artificial intelligence circuits 9642 including a smart contract circuit 9622, a guarantee validation circuit 9698, and a robotic process automation circuit 9648.

The social network data collection circuit 9632 may be structured to collect data using a plurality of algorithms that are configured to monitor social network information about an entity 9664 involved in a loan 9630 in response to the loan guarantee parameter. The social networking input circuit 9644 may be structured to interpret a loan guarantee parameter. The guarantee validation circuit 9698 may be structured to validate a guarantee for the loan in response to the monitored social network information.

The loan guarantee parameter may include a financial condition of the entity, wherein the entity is a guarantor for the loan.

The guarantee validation circuit 9698 may be further structured to determine the financial condition, which may be determined based on at least one attribute selected from the attributes consisting of: a publicly stated valuation of the entity, a property owned by the entity as indicated by public records, a valuation of a property owned by the entity, a bankruptcy condition of the entity, a foreclosure status of the entity, a contractual default status of the entity, a regulatory violation status of the entity, a criminal status of the entity, an export controls status of the entity, an embargo status of the entity, a tariff status of the entity, a tax status of the entity, a credit report of the entity, a credit rating of the entity, a website rating of the entity, a plurality of customer reviews for a product of the entity, a social network rating of the entity, a plurality of credentials of the entity, a plurality of referrals of the entity, a plurality of testimonials for the entity, a plurality of behaviors of the entity, a location of the entity, a jurisdiction of the entity, and a geolocation of the entity.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The data collection circuit 9612 may be structured to obtain information about a condition 9611 of a collateral for the loan, wherein the collateral comprises at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, an item of personal property, and wherein the guarantee validation circuit is further structured to validate the guarantee of the loan in response to the condition of the collateral for the loan.

The condition 9611 of collateral may include a condition attribute selected from the group consisting of a quality of the collateral, a status of title to the collateral, a status of possession of the collateral, a status of a lien on the collateral, a new or used status, a type, a category, a specification, a product feature set, a model, a brand, a manufacturer, a status, a context, a state, a value, a storage location, a geolocation, an age, a maintenance history, a usage history, an accident history, a fault history, an ownership, an ownership history, a price, an assessment, and a valuation. Conditions may be stored as collateral data 9604.

The social networking input circuit 9644 may be further structured to enable a workflow by which a human user enters the loan guarantee parameter to establish a social network data collection and monitoring request.

The smart contract circuit 9622 may be structured to automatically undertake an action related to the loan in response to the validation of the loan. The action related to the loan may be in response to the loan guarantee not being validated, wherein the action comprises at least one action selected from the actions consisting of: a foreclosure action, a lien administration action, an interest-rate adjustment action, a default initiation action, a substitution of collateral, a calling of the loan, and providing an alert to a second entity involved in the loan.

The robotic process automation circuit 9648 may be structured to, based on iteratively training on a training data set 9646 comprising human user interactions with the social network data collection circuit, configure the loan guarantee parameter based on at least one attribute of the loan. The at least one attribute of the loan 9630 may be obtained from a smart contract circuit that manages the loan.

The training data set 9646 may further include outcomes from a plurality of social network data collection and monitoring requests performed by the social network data collection circuit.

The robotic process automation circuit 9648 may be further structured to determine at least one domain to which the social network data collection circuit will apply.

Training may include training the robotic process automation circuit 9648 to configure the plurality of algorithms.

Figure 97:
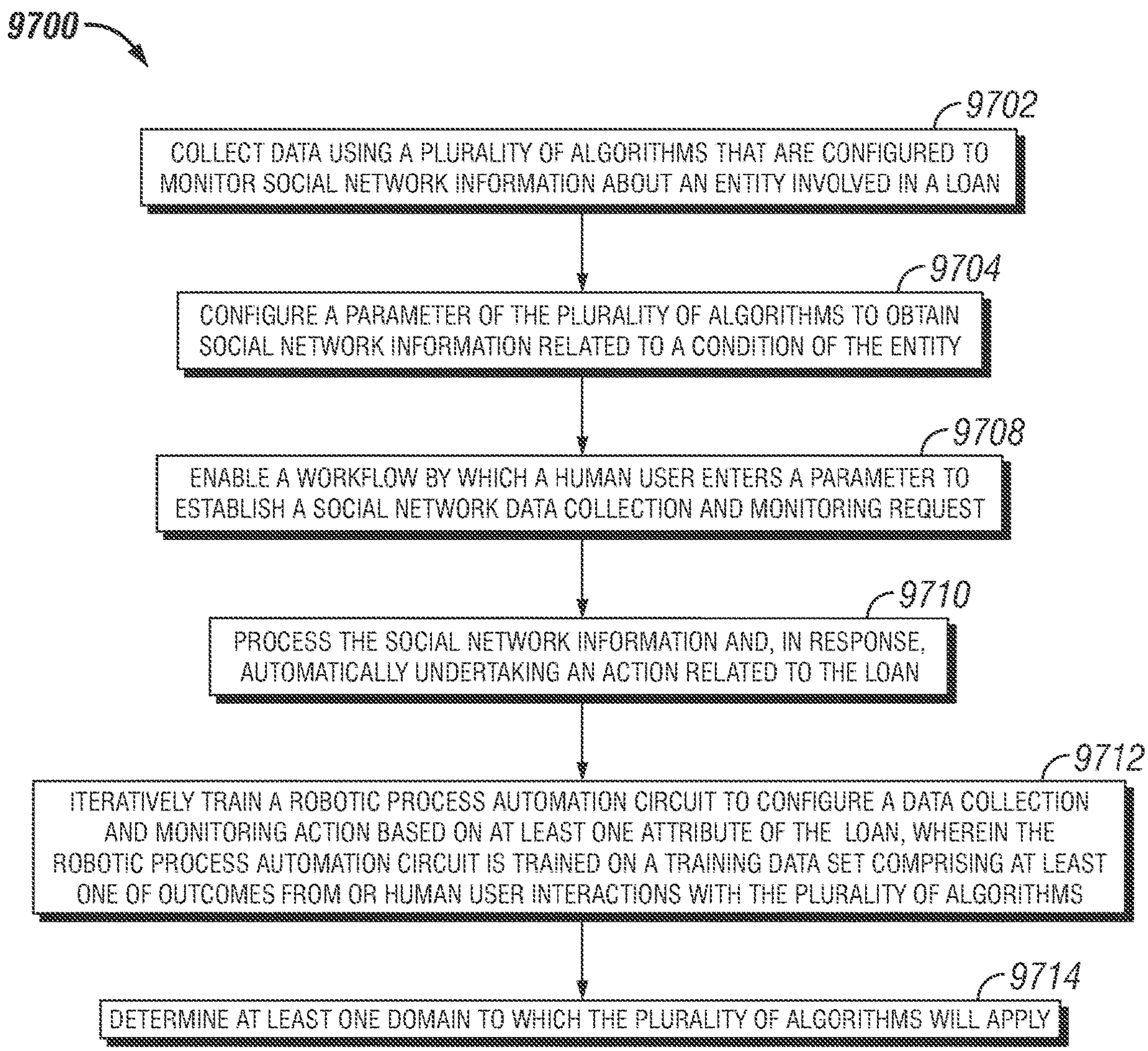
FIG. 97 depicts a smart contract method for modifying a loan.

Referring now to FIG. 97, an illustrative and non-limiting example of a smart contract method for modifying a loan 9700 is depicted. A loan guarantee parameter may be interpreted (step 9701). Data may be collected using a plurality of algorithms that are configured to monitor social network information about an entity involved in a loan in response to the loan guarantee parameter (step 9702). A guarantee for the loan may be validated in response to the monitored social network information (step 9704). A workflow may be enabled by which a human user enters the loan guarantee parameter to establish a social network data collection and monitoring request (step 9708). In response to the validation of the loan, an action related to the loan may be undertaken automatically (step 9710). A robotic process automation circuit may be iteratively trained to configure a data collection and monitoring action based on at least one attribute of the loan, wherein the robotic process automation circuit is trained on a training data set comprising at least one of outcomes from or human user interactions with the plurality of algorithms (step 9712). At least one domain to which the plurality of algorithms will apply may be determined (step 9714).

Figure 98:
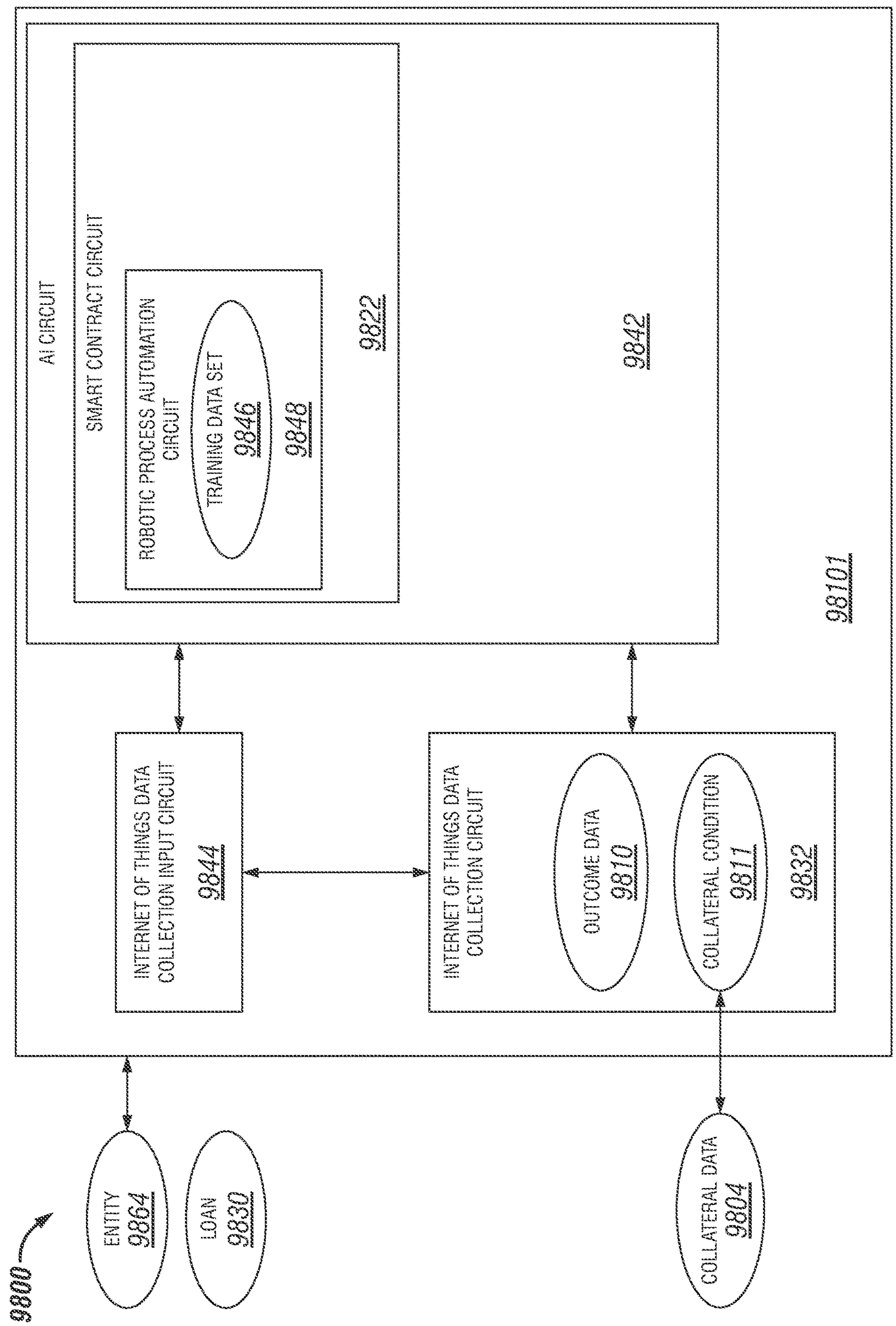
FIG. 98 depicts a monitoring system for validating conditions of a guarantee for a loan.

Referring to FIG. 98, an illustrative and non-limiting example of a monitoring system for validating conditions of a guarantee for a loan 9800 is depicted. The example system may include a controller 9801. The controller 9801 may include an Internet of Things data collection input circuit 9844, Internet of Things data collection circuit 9832, and several artificial intelligence circuits 9842 including a smart contract circuit 9822, a guarantee validation circuit 9898, and a robotic process automation circuit 9848.

The Internet of Things data collection input circuit 9844 may be structured to interpret a loan guarantee parameter 9892. The Internet of Things data collection circuit 9832 may be structured to collect data using at least one algorithm that is configured to monitor Internet of Things information collected from and about an entity 9864 involved in a loan 9830 in response to the loan guarantee parameter. The guarantee validation circuit 9898 may be structured to validate a guarantee for the loan in response to the monitored IoT information.

The loan guarantee parameter 9892 may include a financial condition of the entity, wherein the entity is a guarantor for the loan. Monitored IoT information includes at least one of a publicly stated valuation of the entity, a property owned by the entity as indicated by public records, a valuation of a property owned by the entity, a bankruptcy condition of the entity, a foreclosure status of the entity, a contractual default status of the entity, a regulatory violation status of the entity, a criminal status of an entity, an export controls status of the entity, an embargo status of the entity, a tariff status of the entity, a tax status of the entity, a credit report of the entity, a credit rating of the entity, a website rating of the entity, a plurality of customer reviews for a product of the entity, a social network rating of the entity, a plurality of credentials of the entity, a plurality of referrals of the entity, a plurality of testimonials for the entity, a plurality of behaviors of the entity, a location of the entity, a jurisdiction of the entity, and a geolocation of the entity.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The Internet of Things data collection circuit 9832 may be further structured to obtain information about a condition of a collateral for the loan, wherein the collateral comprises at least one item selected from the items consisting of a vehicle, a ship, a plane, a building, a home, a real estate property, an undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, an item of personal property, and wherein the guarantee validation circuit 9898 is further structured to validate the guarantee of the loan in response to the condition of the collateral for the loan.

The condition 9811 of collateral may include a condition attribute selected from the group consisting of a quality of the collateral, a status of title to the collateral, a status of possession of the collateral, a status of a lien on the collateral, a new or used status, a type, a category, a specification, a product feature set, a model, a brand, a manufacturer, a status, a context, a state, a value, a storage location, a geolocation, an age, a maintenance history, a usage history, an accident history, a fault history, an ownership, an ownership history, a price, an assessment, and a valuation.

The Internet of Things data collection input circuit 9844 may be further structured to enable a workflow by which a human user enters the loan guarantee parameter 9892 to establish an Internet of Things data collection request.

The smart contract circuit 9822 may be structured to automatically undertake an action related to the loan in response to the validation of the loan. The action related to the loan may be in response to the loan guarantee not being validated and wherein the action comprises at least one action selected from the actions consisting of: a foreclosure action, a lien administration action, an interest-rate adjustment action, a default initiation action, a substitution of collateral, a calling of the loan, and providing an alert to second entity involved in the loan.

The robotic process automation circuit 9848 may be structured to, based on iteratively training on a training data set comprising human user interactions with the Internet of Things data collection circuit, configure the loan guarantee parameter based on at least one attribute of the loan. The at least one attribute of the loan is obtained from a smart contract circuit that manages the loan. The training data set 9846 may further include outcomes from a plurality of Internet of Things data collection and monitoring requests performed by the Internet of Things data collection circuit.

The robotic process automation circuit 9848 may be further structured to determine at least one domain to which the Internet of Things data collection circuit will apply.

Training may include training the robotic process automation circuit 9848 to configure the at least one algorithm.

Figure 99:
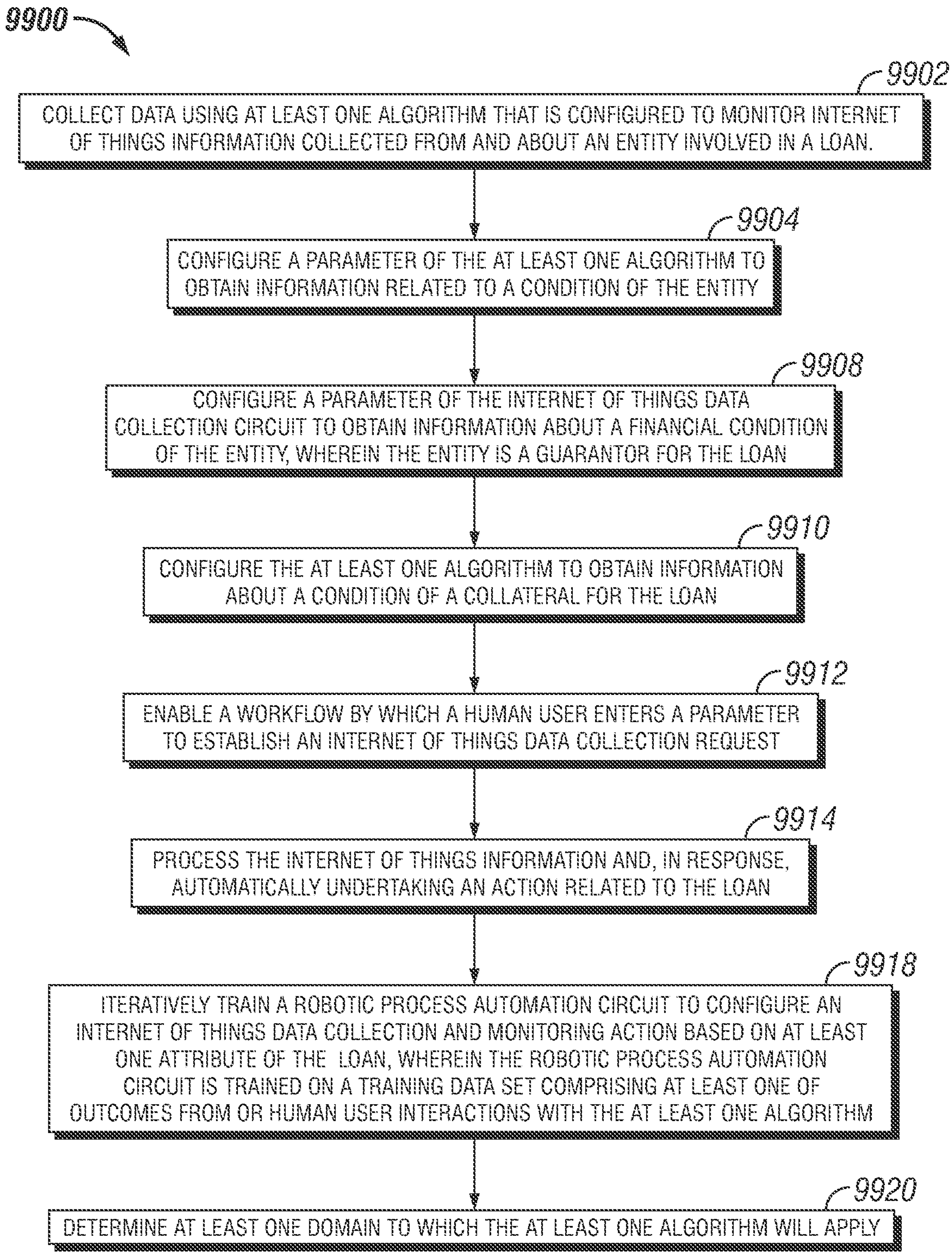
FIG. 99 depicts a monitoring method for validating conditions of a guarantee for a loan.

Referring to FIG. 99, an illustrative and non-limiting example monitoring method for validating conditions of a guarantee for a loan 9900 is depicted. The example method may include interpreting a loan guarantee parameter (step 9902); collecting data using a plurality of algorithms that are configured to monitor Internet of Things (IoT) information collected from and about an entity involved in a loan in response to the loan guarantee parameter (step 9904); and validating a guarantee for the loan in response to the monitored IoT information (step 9905).

The loan guarantee parameter may be configured to obtain information about a financial condition of the entity, wherein the entity is a guarantor for the loan (step 9908). The at least one algorithm may be configured to obtain information about a condition of a collateral for the loan (step 9910), wherein the collateral comprises at least one item selected from the items consisting of a vehicle, a ship, a plane, a building, a home, a real estate property, an undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property; and validating the guarantee for the loan further in response to the condition of the collateral for the loan.

A workflow by which a human user enters the loan guarantee parameter to establish an Internet of Things data collection request may be enabled (step 9912).

An action related to the loan may be undertaken automatically in response to the validation (step 9914).

The action related to the loan may be in response to the loan guarantee not being validated, and wherein the action comprises a foreclosure action.

The action related to the loan may be in response to the loan guarantee not being validated, and wherein the action comprises a lien administration action.

The action related to the loan may be in response to the loan guarantee not being validated, and wherein the action comprises an interest-rate adjustment action.

The action related to the loan may be in response to the loan guarantee not being validated, and wherein the action comprises a default initiation action.

The action related to the loan may be in response to the loan guarantee not being validated, and wherein the action comprises a substitution of collateral.

The action related to the loan may be in response to the loan guarantee not being validated, and wherein the action comprises a calling of the loan.

The action related to the loan may be in response to the loan guarantee not being validated, and wherein the action comprises providing an alert to a second entity involved in the loan.

A robotic process automation circuit may be iteratively trained to configure an Internet of Things data collection and monitoring action based on at least one attribute of the loan, wherein the robotic process automation circuit is trained on a training data set comprising at least one of outcomes from or human user interactions with the plurality of algorithms (step 9918).

At least one domain to which the at least one algorithm will apply may be determined (step 9920). Training may include training the robotic process automation circuit to configure the plurality of algorithms.

The training data set may further include outcomes from a set of IoT data collection and monitoring requests.

Figure 100:
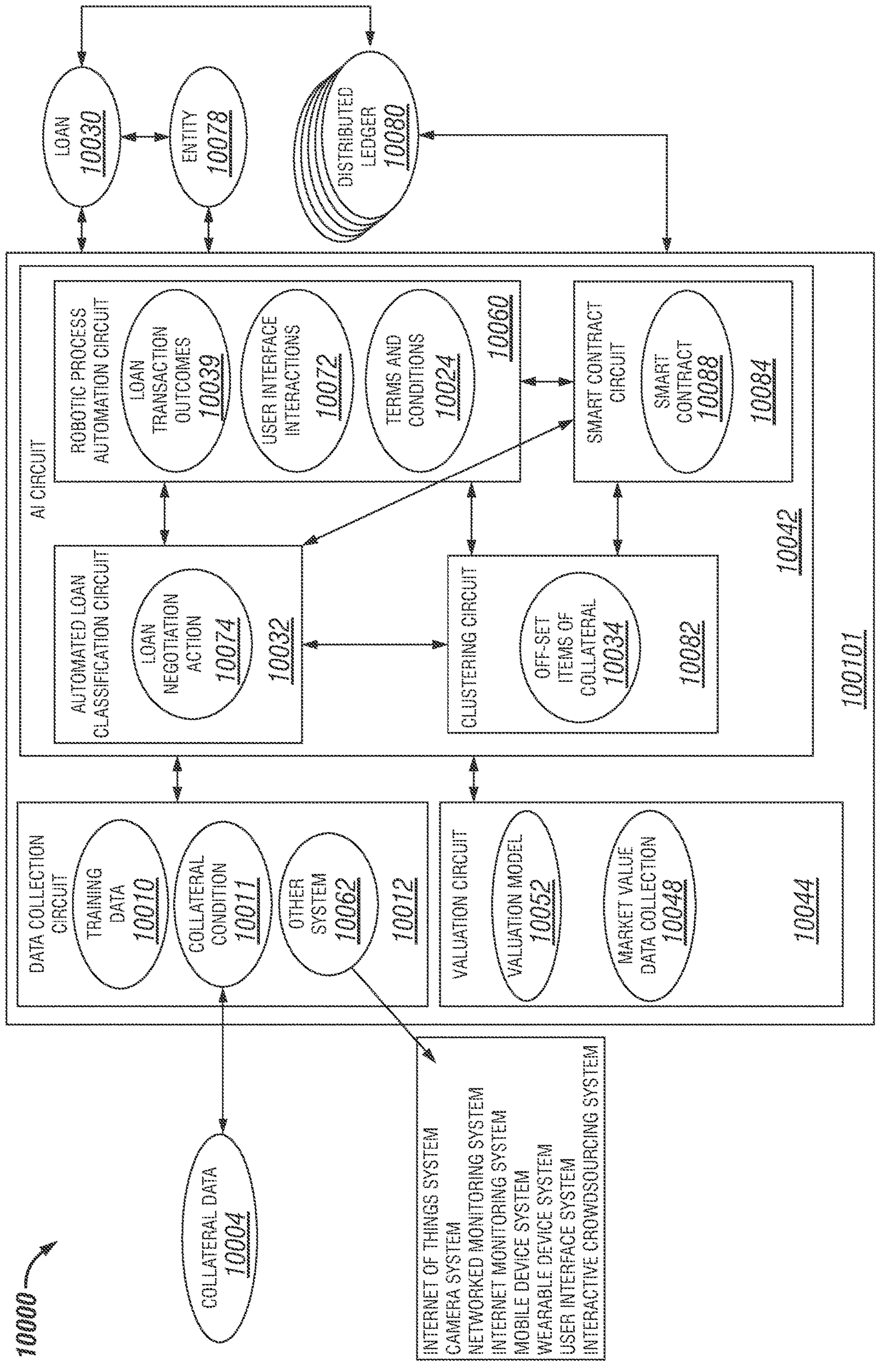
FIG. 100 depicts a robotic process automation system for negotiating a loan.

Referring now to FIG. 100, an illustrative and non-limiting example of a robotic process automation system for negotiating a loan 10000 is depicted. The example system may include a controller 10001. The controller 10001 may include a data collection circuit 10012, a valuation circuit 10044, and several artificial intelligence circuits 10042 including an automated loan classification circuit 10032, a robotic process automation circuit 10060, a smart contract circuit 10084, and a clustering circuit 10082.

The data collection circuit 10012 may be structured to collect a training set of interactions 10010 from at least one entity 10078 related to at least one loan transaction. An automated loan classification circuit 10032 may be trained on the training set of interactions 10010 to classify an at least one loan negotiation action. The robotic process automation circuit 10060 may be trained on a training set of a plurality of loan negotiation actions 10074 classified by the automated loan classification circuit 10032 and a plurality of loan transaction outcomes 10039 to negotiate a terms and conditions 10024 of a new loan 10030 on behalf of a party to the new loan.

The data collection circuit may further include at least one other system 10062 selected from the systems consisting of: an Internet of Things system, a camera system, a networked monitoring system, an internet monitoring system, a mobile device system, a wearable device system, a user interface system, and an interactive crowdsourcing system. The at least one entity may be a party to the at least one loan transaction and may be selected from the entities consisting of: a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, and an accountant.

The automated loan classification circuit 10032 may include a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

The robotic process automation circuit 10060 may be further trained on a plurality of interactions of parties with a plurality of user interfaces involved in a plurality of lending processes.

The smart contract circuit 10084 may be structured to automatically configure a smart contract for the new loan 10030 based on an outcome of the negotiation.

A distributed ledger 10080 may be associated with the new loan 10030, wherein the distributed ledger 10080 is structured to record at least one of an outcome and a negotiating event of the negotiation.

The new loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The valuation circuit 10044 may be structured to use a valuation model 10052 to determine a value for a collateral for the new loan. The collateral may include at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

The valuation circuit may further include a market value data collection circuit 10048 structured to monitor and report on marketplace information relevant to a value of the collateral. The market value data collection circuit 10048 may monitor pricing or financial data for an offset collateral item 10034 in at least one public marketplace. A set of offset collateral items 10034 for valuing the collateral may be constructed using a clustering circuit 10082 based on an attribute of the collateral. The attribute may be selected from among a category of the collateral, an age of the collateral, a condition of the collateral, a history of the collateral, a storage condition of the collateral, and a geolocation of the collateral. The terms and conditions 10024 for the new loan may include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

Figure 101:
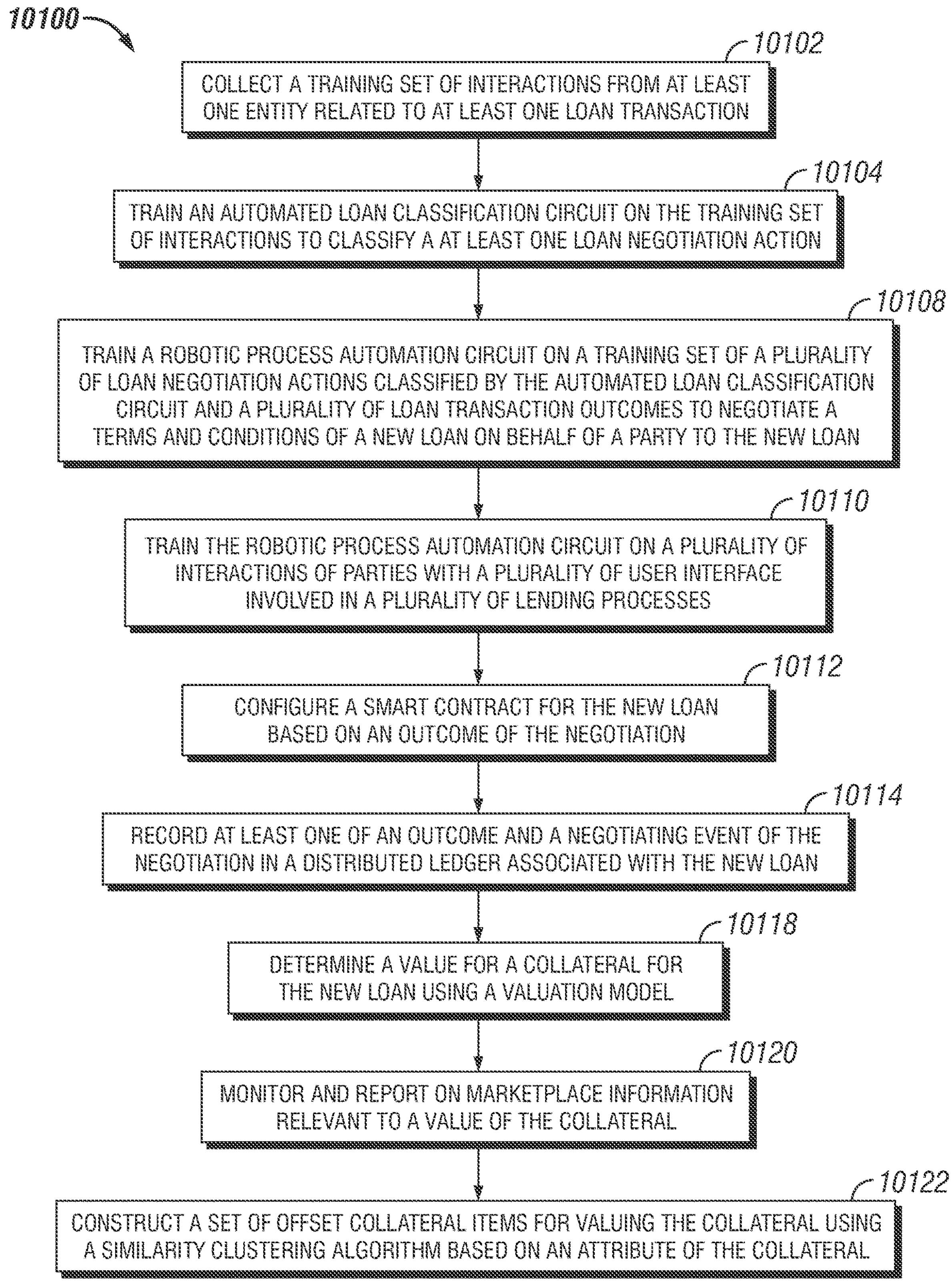
FIG. 101 depicts a robotic process automation method for negotiating a loan.

Referring now to FIG. 101, an illustrative and non-limiting example of a robotic process automation method for negotiating a loan 10000 is depicted. The example method may include collecting a training set of interactions from at least one entity related to at least one loan transaction (step 10102); training an automated loan classification circuit on the training set of interactions to classify an at least one loan negotiation action (step 10104); and training a robotic process automation circuit on a training set of a plurality of loan negotiation actions classified by the automated loan classification circuit and a plurality of loan transaction outcomes to negotiate a terms and conditions of a new loan on behalf of a party to the new loan (step 10108).

The robotic process automation circuit may be trained on a plurality of interactions of parties with a plurality of user interfaces involved in a plurality of lending processes (step 10110).

A smart contract for the new loan may be configured based on an outcome of the negotiation (step 10112).

At least one of an outcome and a negotiating event of the negotiation may be recorded in a distributed ledger associated with the new loan (step 10114).

A value for a collateral for the new loan may be determined using a valuation model (step 10118).

An example method may further include monitoring and reporting on marketplace information relevant to a value of the collateral (step 10120).

A set of offset collateral items for valuing the collateral may be constructed using a similarity clustering algorithm based on an attribute of the collateral (step 10122).

Figure 102:
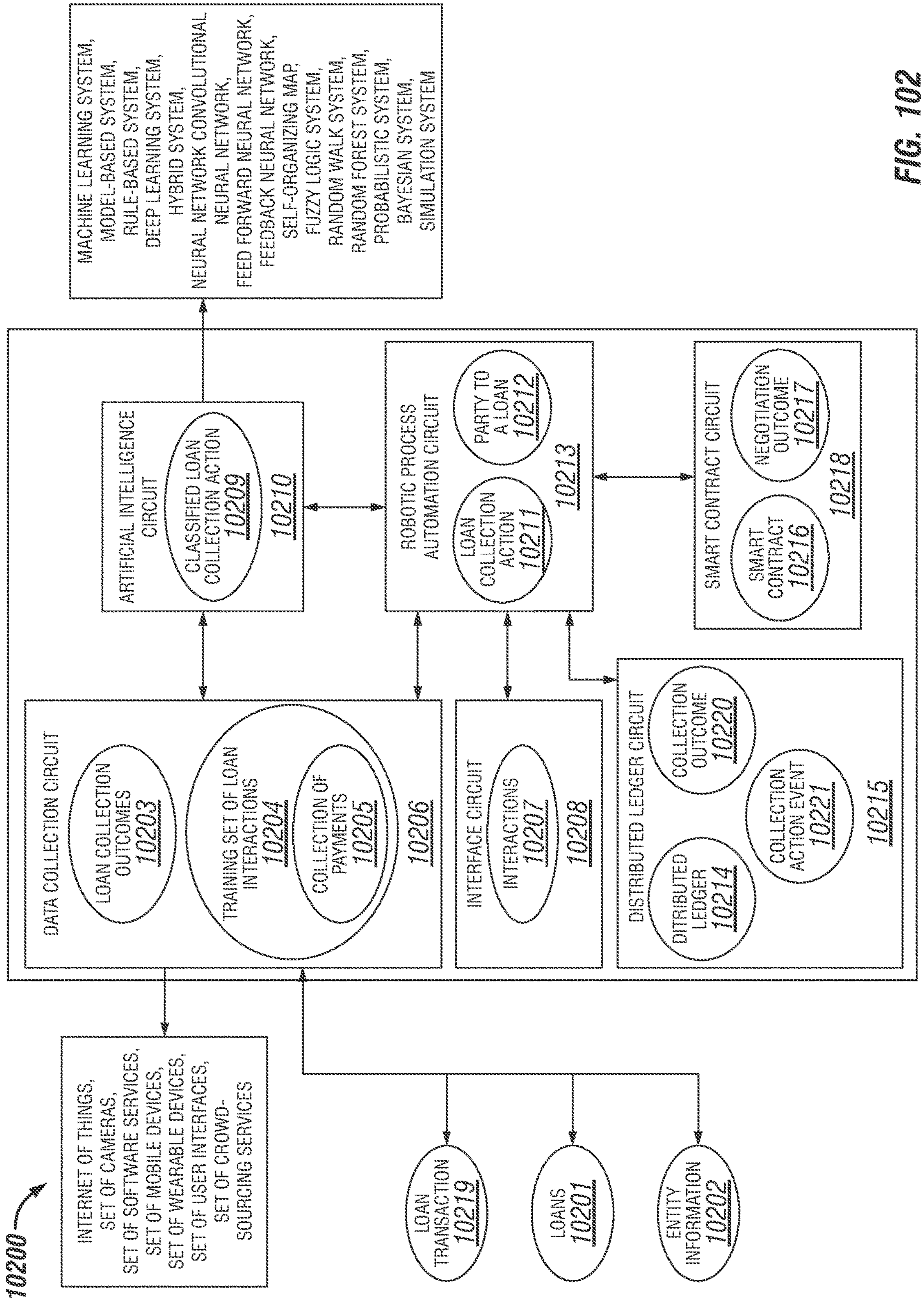
FIG. 102 depicts a system for adaptive intelligence and robotic process automation.

Referring to FIG. 102, an illustrative and non-limiting example system for adaptive intelligence and robotic process automation capabilities 10200 is depicted. The example system may include a data collection circuit 10206 which may collect data such as loan collection outcomes 10203, training set of loan interactions 10204, which may include collection of payments 10205, and the like. The data may be collected from loan transactions 10219, loan data 10201, entity information 10202, and the like. The data may be collected from a variety of sources and systems such as: an Internet of Things system, a camera system, a networked monitoring system, an internet monitoring system, a mobile device system, a wearable device system, a user interface system, and an interactive crowdsourcing system. The loan collection outcomes 10203 may include at least one outcome such as a response to a collection contact event, a payment of a loan, a default of a borrower on a loan, a bankruptcy of a borrower of a loan, an outcome of a collection litigation, a financial yield of a set of collection actions, a return on investment on collection, a measure of reputation of a party involved in collection, and the like.

The system may also include an artificial intelligence circuit 10210 that may be structured to classify a set of loan collection actions 10209 based at least in part on the training set of loan interactions 10204. The artificial intelligence circuit 10210 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10213 structured to perform at least one loan collection action 10211 on behalf of a party to a loan 10212 based at least in part on the training set of loan interactions 10204 and the set of loan collection outcomes 10203. The loan collection action 10211 undertaken by the robotic process automation circuit 10213 may be at least one of a referral of a loan to an agent for collection, configuration of a collection communication, scheduling of a collection communication, configuration of content for a collection communication, configuration of an offer to settle a loan, termination of a collection action, deferral of a collection action, configuration of an offer for an alternative payment schedule, initiation of a litigation, initiation of a foreclosure, initiation of a bankruptcy process, a repossession process, placement of a lien on collateral, and the like. The party to a loan 10212 may include at least one party such as a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, an accountant, and the like. Loans 10201 may include at least one auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan and the like.

The system may further include an interface circuit 10208 structured to receive interactions 10207 from one or more of the entities 10202. In some embodiments, the robotic process automation circuit 10213 may be trained on the interactions 10207. The system may further include a smart contract circuit 10218 structured to determine completion of a negotiation of the loan collection action 10211 and modify a contract 10216 based on an outcome of the negotiation 10217.

The system may further include a distributed ledger circuit 10215 structured to determine at least one of a collection outcome 10220 or an event 10221 associated with the loan collection action 10211. The distributed ledger circuit 10215 may be structured to record, in a distributed ledger 10214 associated with the loan, the event 10221 and/or the collection outcome 10220.

Figure 103:
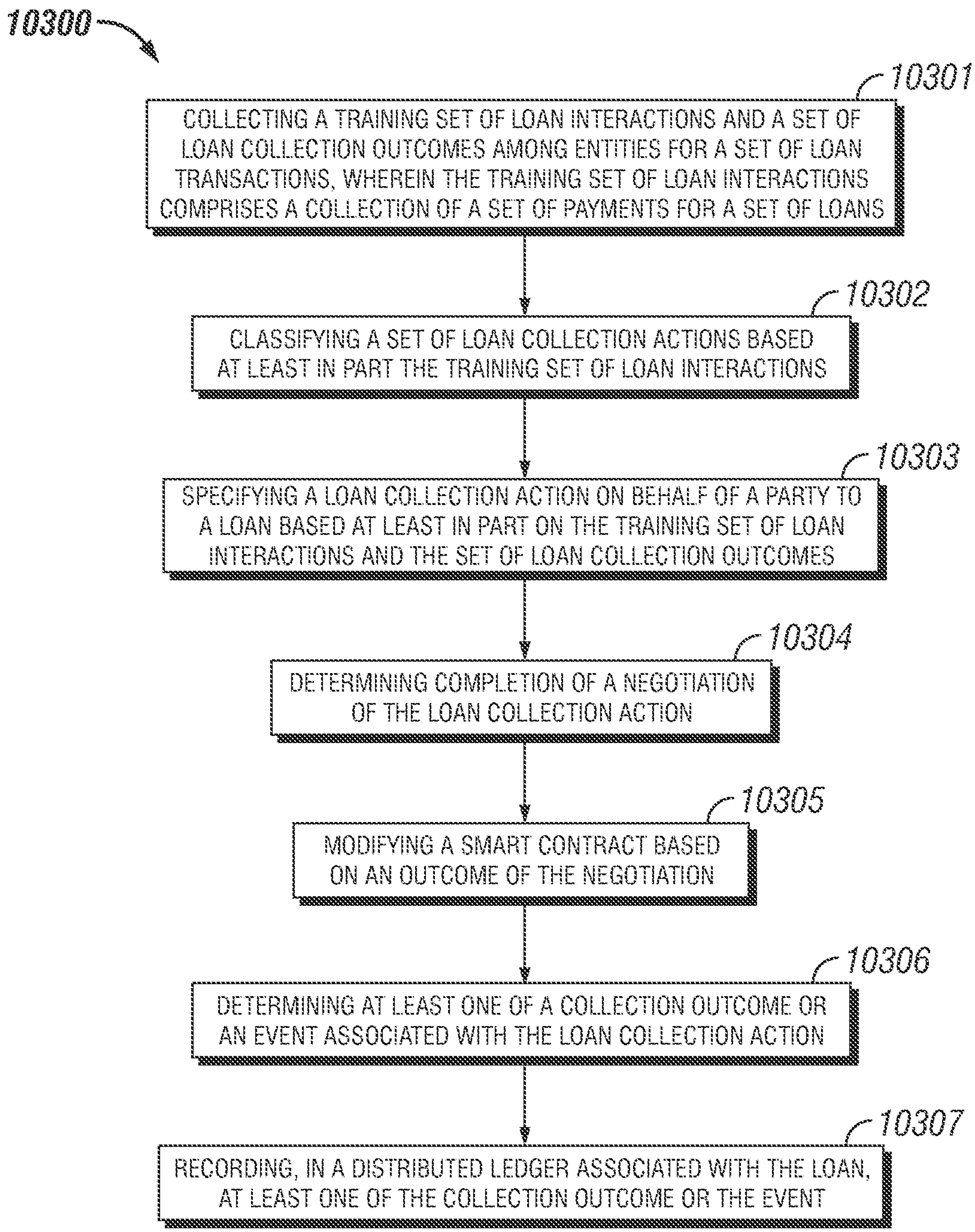
FIG. 103 depicts a loan collection method.

Referring to FIG. 103, an illustrative and non-limiting example method 10300 is depicted. The example method 10300 may include step 10301 for collecting a training set of loan interactions and a set of loan collection outcomes among entities for a set of loan transactions, wherein the training set of loan interactions comprises a collection of a set of payments for a set of loans. A set of loan collection actions based at least in part the training set of loan interactions may be classified (step 10302). The method may further include the step 10303 of specifying a loan collection action on behalf of a party to a loan based at least in part on the training set of loan interactions and the set of loan collection outcomes.

The method 10300 may further include the step 10304 of determining completion of a negotiation of the loan collection action. Based on the outcome of the negotiations, a smart contract may be modified in step 10305. The method may also include the step 10306 of determining at least one of a collection outcome or an event associated with the loan collection action. The at least one of the collection outcome or the event may be recorded in a distributed ledger associate with the loan in step 10307.

Figure 104:
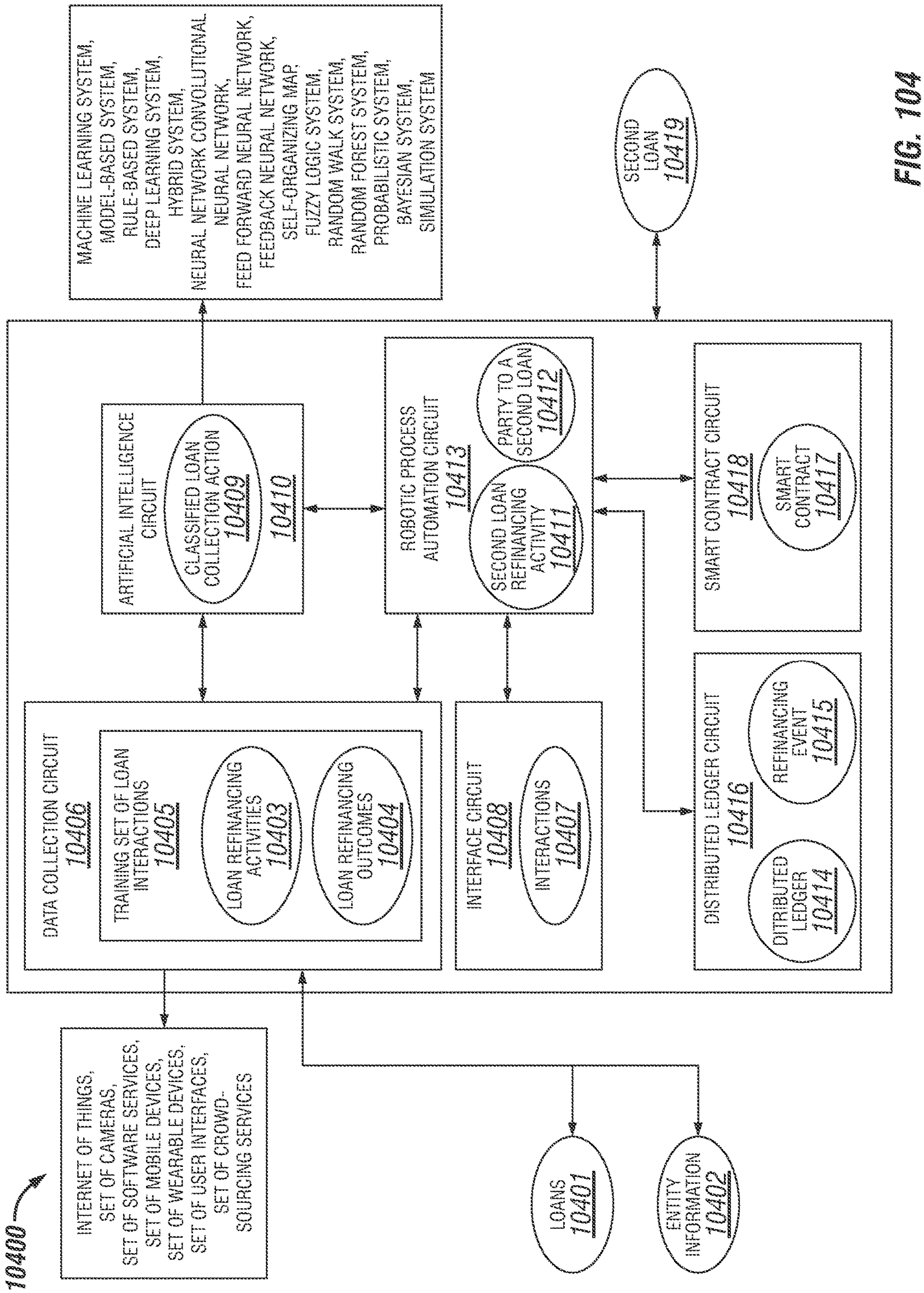
FIG. 104 depicts a system for adaptive intelligence and robotic process automation.

Referring to FIG. 104, an illustrative and non-limiting example system for adaptive intelligence and robotic process automation capabilities 10400 is depicted. The example system may include a data collection circuit 10406 structured to collect a training set of loan interactions between entities 10402, wherein the training set of loan interactions may include a set of loan refinancing activities 10403 and a set of loan refinancing outcomes 10404. The system may include an artificial intelligence circuit 10410 structured to classify the set of loan refinancing activities, wherein the artificial intelligence circuit is trained on the training set of loan interactions. The system may include a robotic process automation circuit 10413 structured to perform a second loan refinancing activity 10411 on behalf of a party to a second loan 10412, wherein the robotic process automation circuit is trained on the set of loan refinancing activities and the set of loan refinancing outcomes. The example system may include a data collection circuit 10406, which may collect data such as a training set of loan interactions between entities 10402. Data related to the set of loan interactions between entities 10402 may include data related to loan refinancing activities 10403 and loan refinancing outcomes 10404. The data may be collected from loan data 10401, information about entities 10402, and the like. The data may be collected from a variety of sources and systems such as: an Internet of Things system, a camera system, a networked monitoring system, an internet monitoring system, a mobile device system, a wearable device system, a user interface system, and an interactive crowdsourcing system. The loan refinancing activity 10403 may include at least one activity such as initiating an offer to refinance, initiating a request to refinance, configuring a refinancing interest rate, configuring a refinancing payment schedule, configuring a refinancing balance, configuring collateral for a refinancing, managing use of proceeds of a refinancing, removing or placing a lien associated with a refinancing, verifying title for a refinancing, managing an inspection process, populating an application, negotiating terms and conditions for a refinancing, closing a refinancing, and the like.

The system may also include an artificial intelligence circuit 10410 that may be structured to classify the set of loan refinancing activities 10409 based at least in part on the training set of loan interactions 10405. The artificial intelligence circuit 10410 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10413 structured to perform a second loan refinancing activity 10411 on behalf of a party to a second loan 10412 based at least in part on the set of loan refinancing activities 10403 and the set of loan refinancing outcomes 10404. The party to a second loan 10412 may include least one such as a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like.

The second loan 10419 may include at least one auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan and the like.

The system may further include an interface circuit 10408 structured to receive interactions 10407 from one or more of the entities 10402. In some embodiments, the robotic process automation circuit 10413 may be trained on the interactions 10407. The system may further include a smart contract circuit 10418 structured to determine completion of the second loan refinancing activity 10411 and modify a smart refinance contract 10417 based on an outcome of the second loan refinancing activity 10411.

The system may further include a distributed ledger circuit 10416 structured to determine an event 10415 associated with the second loan refinancing activity 10411. The distributed ledger circuit 10416 may be structured to record, in a distributed ledger 10414 associated with the second loan 10419, the event 10415 associated with the second loan refinancing activity 10411.

Figure 105:
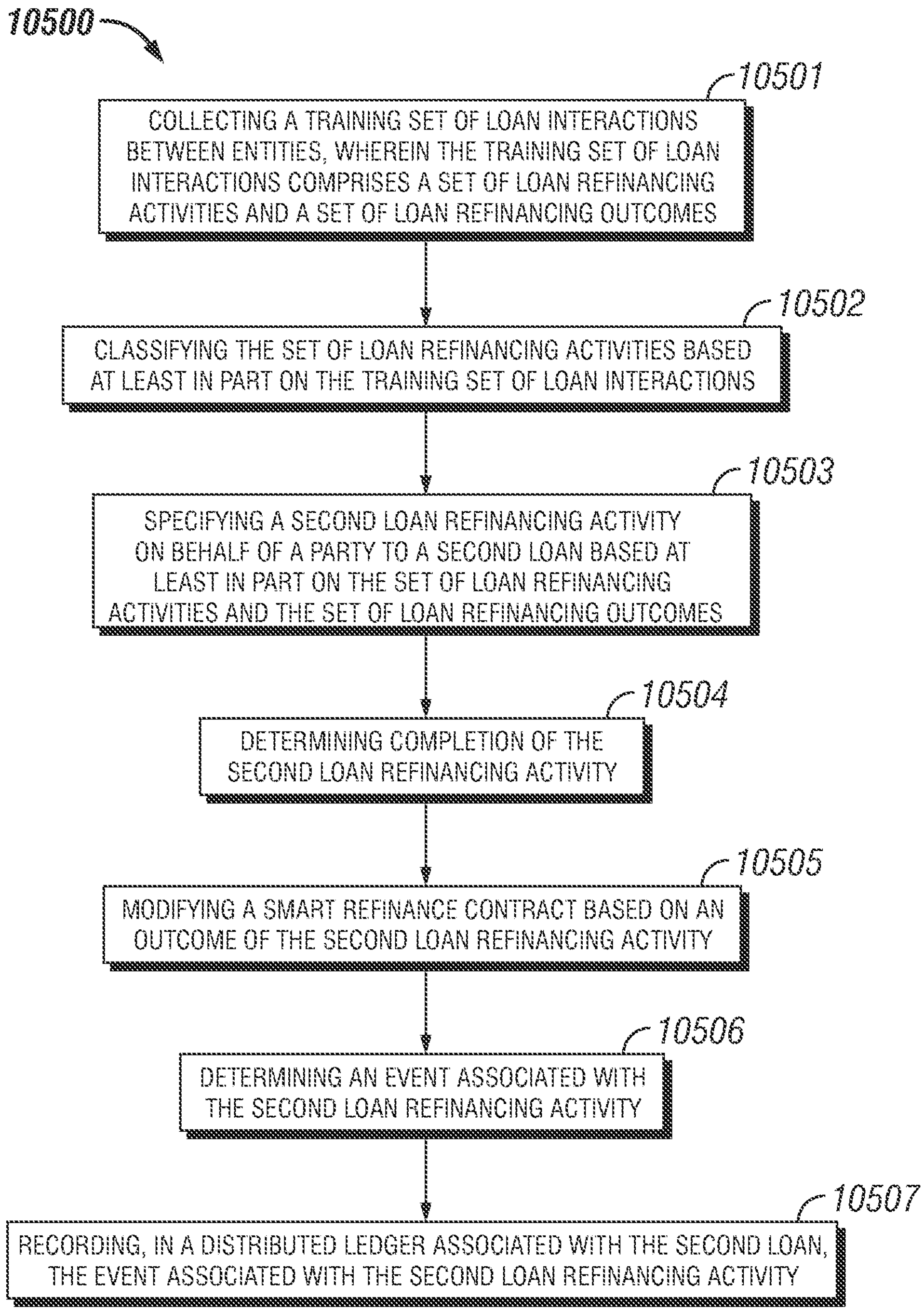
FIG. 105 depicts a loan refinancing method.

Referring to FIG. 105, an illustrative and non-limiting example method 10500 is depicted. The example method 10500 may include step 10501 for collecting a training set of loan interactions between entities, wherein the training set of loan interactions comprises a set of loan refinancing activities and a set of loan refinancing outcomes. A set of loan refinancing activities based at least in part on the training set of loan interactions may be classified (step 10502). The method may further include the step 10503 of specifying a second loan refinancing activity on behalf of a party to a second loan based at least in part on the set of loan refinancing activities and the set of loan refinancing outcomes.

The method 10500 may further include the step 10504 of determining completion of the second loan refinancing activity. Based on the outcome of the second loan refinancing activity, a smart refinance contract may be modified in step 10505. The method may also include the step 10506 of determining an event associated with the second loan refinancing activity. The event associated with the second loan refinancing activity may be recorded in a distributed ledger associate with the second loan in step 10507.

Figure 106:
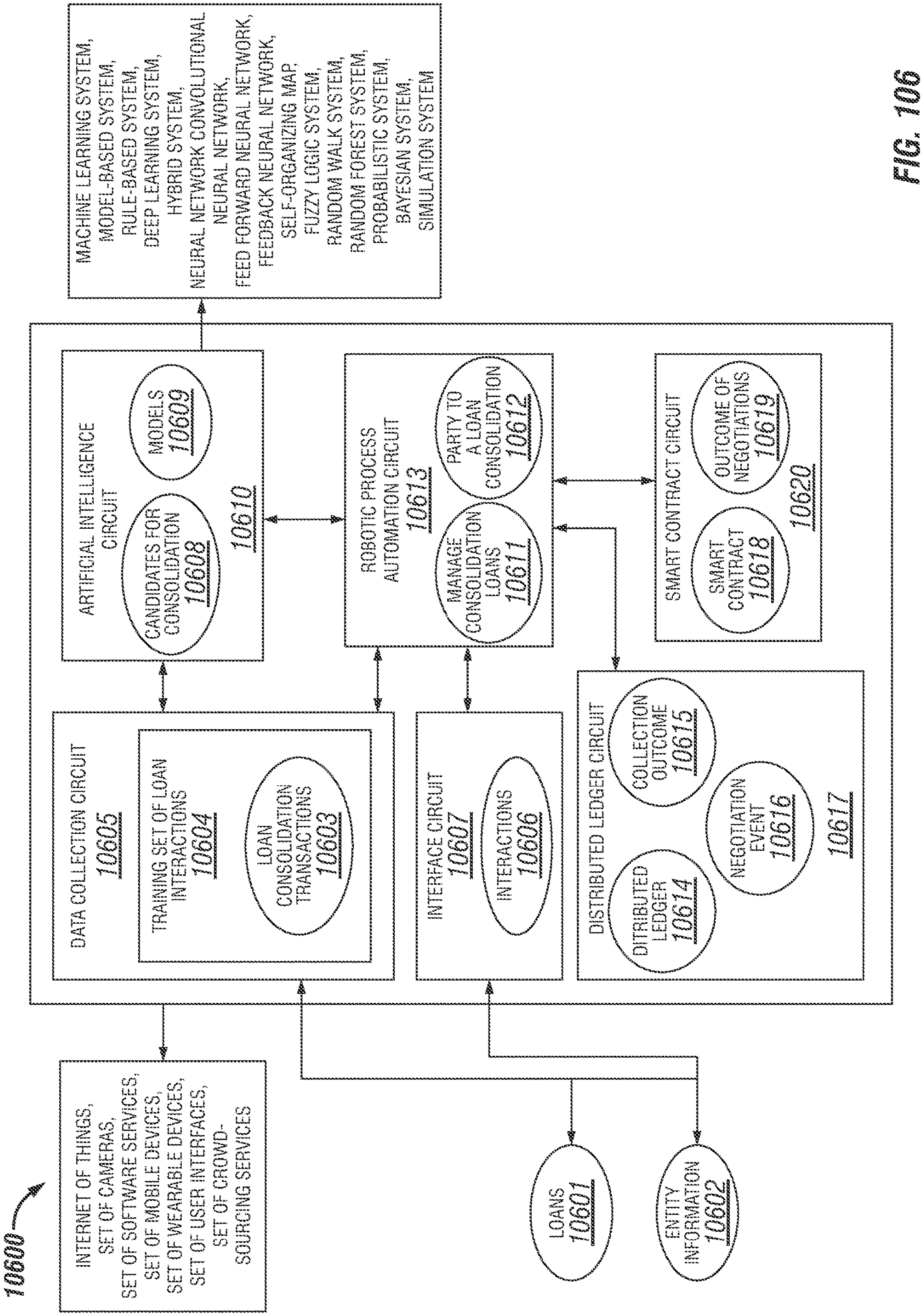
FIG. 106 depicts a system for adaptive intelligence and robotic process automation.

Referring to FIG. 106, an illustrative and non-limiting example system for adaptive intelligence and robotic process automation capabilities 10600 is depicted. The example system may include a data collection circuit 10605, which may collect data such as a training set of loan interactions 10604 between entities, which may include a set of loan consolidation transactions 10603 and the like. The data may be collected from loan data 10601, information regarding entities 10602, and the like. The data may be collected from a variety of sources and systems such as: an Internet of Things system, a camera system, a networked monitoring system, an internet monitoring system, a mobile device system, a wearable device system, a user interface system, and a crowdsourcing system.

The system may also include an artificial intelligence circuit 10610 that may be structured to classify a set of loans as candidates for consolidation 10608 based at least in part on the training set of loan interactions 10604. The artificial intelligence circuit 10610 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10613 structured to manage a consolidation of at least a subset of the set of loans 10611 on behalf of a party to the loan consolidation 10612 based at least in part on the training set of loan consolidation transactions 10603. Managing the consolidation may include identification of loans from a set of candidate loans, preparation of a consolidation offer, preparation of a consolidation plan, preparation of content communicating a consolidation offer, scheduling a consolidation offer, communicating a consolidation offer, negotiating a modification of a consolidation offer, preparing a consolidation agreement, executing a consolidation agreement, modifying collateral for a set of loans, handling an application workflow for consolidation, managing an inspection, managing an assessment, setting an interest rate, deferring a payment requirement, setting a payment schedule, or closing a consolidation agreement.

The artificial intelligence circuit may further include a model 10609 that may be used to classify loans as candidates for consolidation 10608. The model 10609 may process attributes of entities; the attributes may include identity of a party, interest rate, payment balance, payment terms, payment schedule, type of loan, type of collateral, financial condition of party, payment status, condition of collateral, value of collateral, and the like.

The party to a loan consolidation 10612 may include at least one such as a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, an accountant, and the like.

Loans 10601 may include at least one auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan and the like.

The system may further include an interface circuit 10607 structured to receive interactions 10606 from one or more of the entities 10602. In some embodiments, the robotic process automation circuit 10613 may be trained on the interactions 10606. The system may further include a smart contract circuit 10620 structured to determine a completion of a negotiations of the consolidation and modify a contract 10618 based on an outcome of the negotiation 10619.

The system may further include a distributed ledger circuit 10617 structured to determine at least one of an outcome 10615 or a negotiation event 10616 associated with the consolidation. The distributed ledger circuit 10617 may be structured to record, in a distributed ledger 10614 associated with the loan, the event 10616 and/or the outcome 10615.

Figure 107:
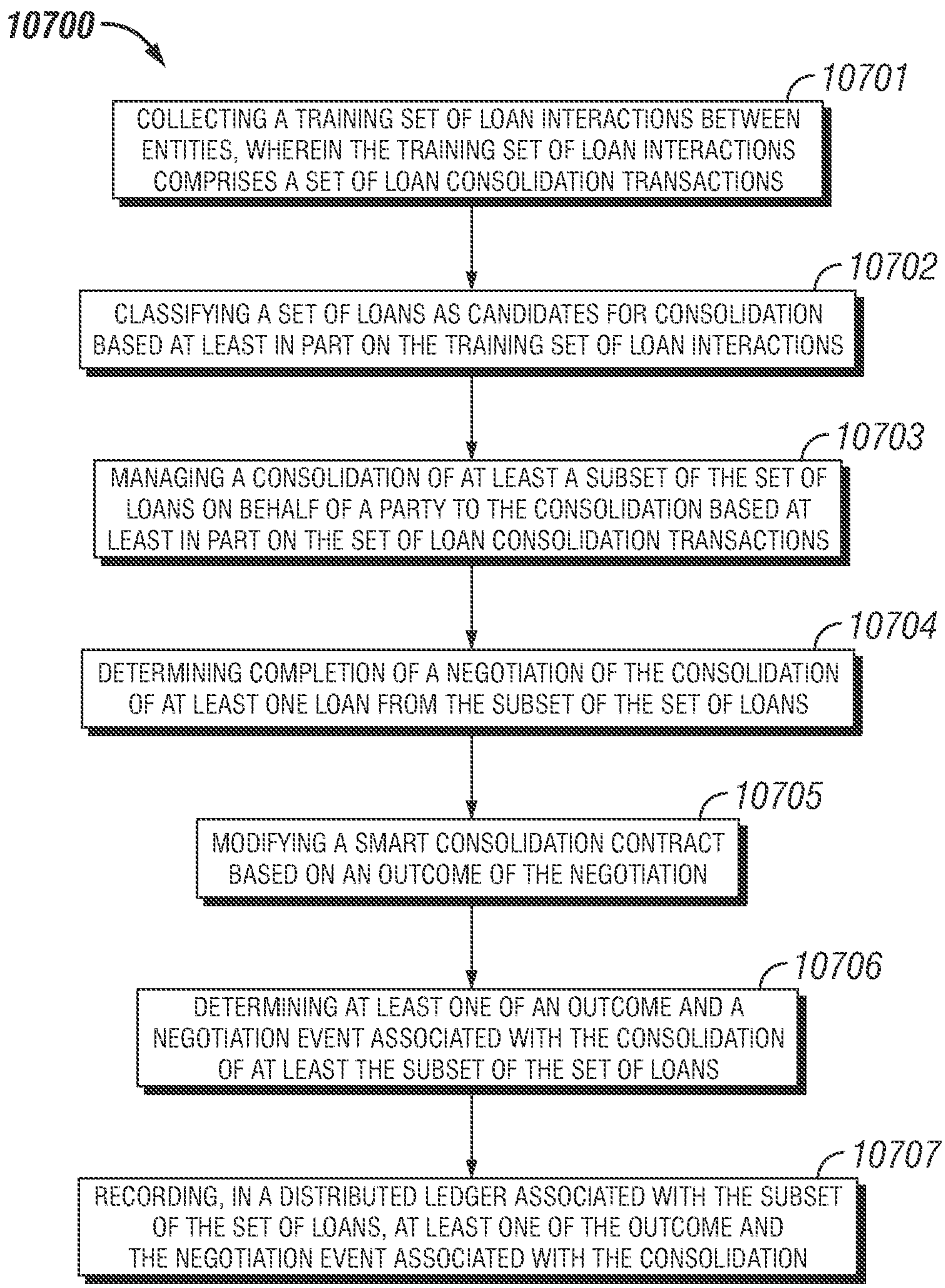
FIG. 107 depicts a for loan consolidation method.

Referring to FIG. 107, an illustrative and non-limiting example method 10700 is depicted. The example method 10700 may include step 10701 of collecting a training set of loan interactions between entities, wherein the training set of loan interactions comprises a set of loan consolidation transactions. A set of loans as candidates for consolidation based at least in part on the training set of loan interactions may be classified (step 10702). The method may further include the step 10703 of managing a consolidation of at least a subset of the set of loans on behalf of a party to the consolidation based at least in part on the set of loan consolidation transactions.

The method 10700 may further include the step 10704 of determining completion of a negotiation of the consolidation of at least one loan from the subset of the set of loans. Based on the outcome of the negotiations, a smart contract may be modified in step 10705. The method may also include the step 10706 of determining at least one of an outcome and a negotiation event associated with the consolidation of at least the subset of the set of loans. The at least one of the outcome and the negotiation event may be recorded in a distributed ledger associated with the consolidation in step 10707.

Figure 108:
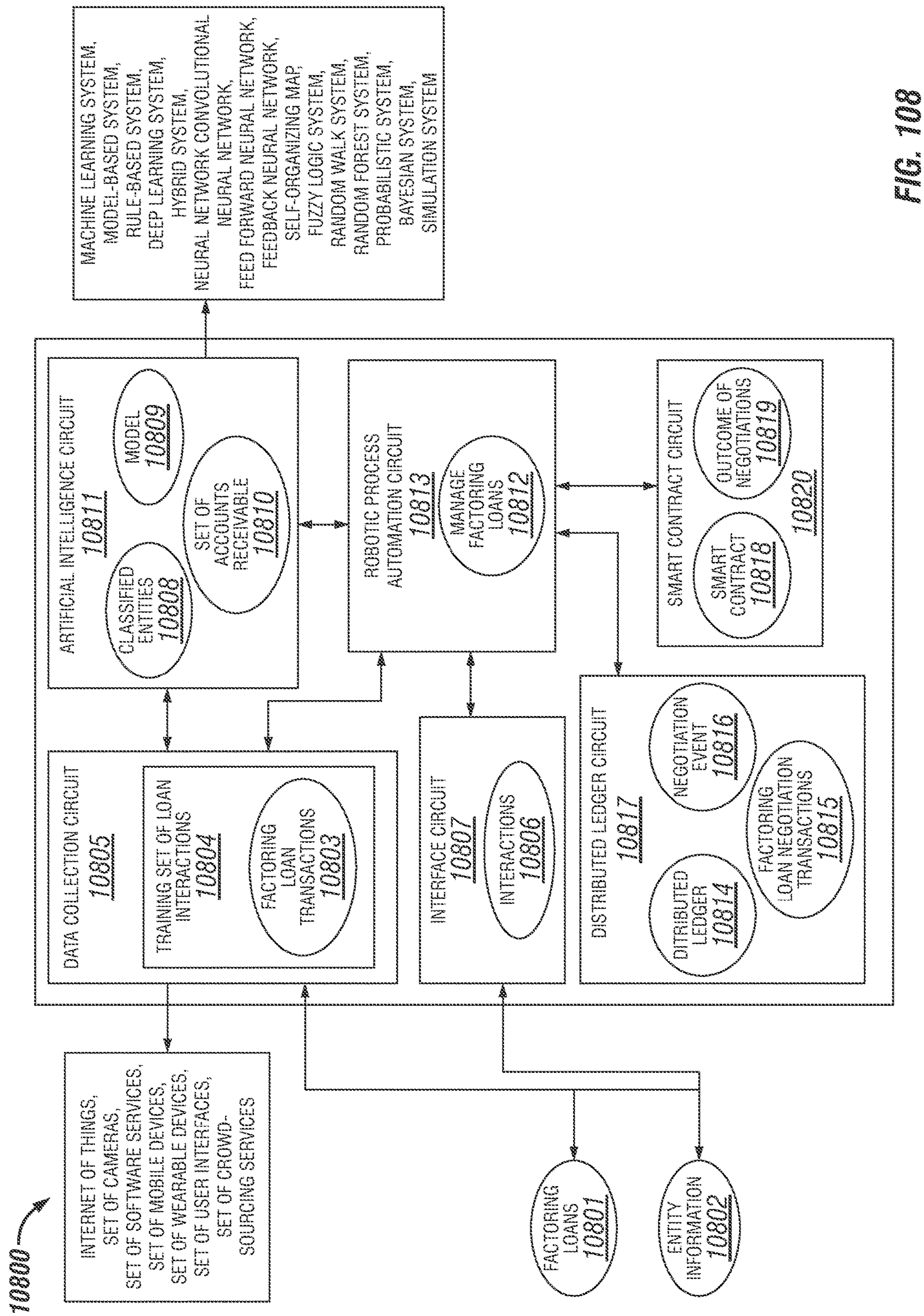
FIG. 108 depicts a system for adaptive intelligence and robotic process automation.

Referring to FIG. 108, an illustrative and non-limiting example system for adaptive intelligence and robotic process automation capabilities 10800 is depicted. The example system may include a data collection circuit 10805, which may collect data information about entities 10802 involved in a set of factoring loans 10801 and a training set of interactions 10804 between entities for a set of factoring loan transactions 10803. The data may be collected from a variety of sources and systems such as: an Internet of Things system, a camera system, a networked monitoring system, an internet monitoring system, a mobile device system, a wearable device system, a user interface system, and a crowdsourcing system.

The system may also include an artificial intelligence circuit 10811 that may be structured to classify entities 10808 involved in the set of factoring loans based at least in part on the training set of interactions 10804. The artificial intelligence circuit 10811 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10813 structured to manage a factoring loan 10812 based at least in part on the factoring loan transactions 10803. Managing the factoring loan may include managing at least one of a set of assets for factoring, identification of loans for factoring from a set of candidate loans, preparation of a factoring offer, preparation of a factoring plan, preparation of content communicating a factoring offer, scheduling a factoring offer, communicating a factoring offer, negotiating a modification of a factoring offer, preparing a factoring agreement, executing a factoring agreement, modifying collateral for a set of factoring loans, handing transfer of a set of accounts receivable, handling an application workflow for factoring, managing an inspection, managing an assessment of a set of assets to be factored, setting an interest rate, deferring a payment requirement, setting a payment schedule, or dosing a factoring agreement.

The artificial intelligence circuit 10811 may further include a model 10809 that may be used to process attributes of entities involved in the set of factoring loans; the attributes may include assets used for factoring, identity of a party, interest rate, payment balance, payment terms, payment schedule, type of loan, type of collateral, financial condition of party, payment status, condition of collateral, or value of collateral. The assets used for factoring may include a set of accounts receivable 10810. At least one entity of the entities 10802 may be a party to at least one factoring loan transactions 10803. The party may include least one such as a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, an accountant, and the like.

The system may further include an interface circuit 10807 structured to receive interactions 10806 from one or more of the entities 10802. In some embodiments, the robotic process automation circuit 10813 may be trained on the interactions 10806.

The system may further include a smart contract circuit 10820 structured to determine a completion of a negotiation of the factoring loan and modify a contract 10818 based on an outcome of the negotiation 10819.

The system may further include a distributed ledger circuit 10817 structured to determine at least one of an outcome 10815 or a negotiation event 10816 associated with the negotiation of the factoring loan. The distributed ledger circuit 10817 may be structured to record, in a distributed ledger 10814 associated with the factoring loan, the event 10816 and/or the outcome 10815.

Figure 109:
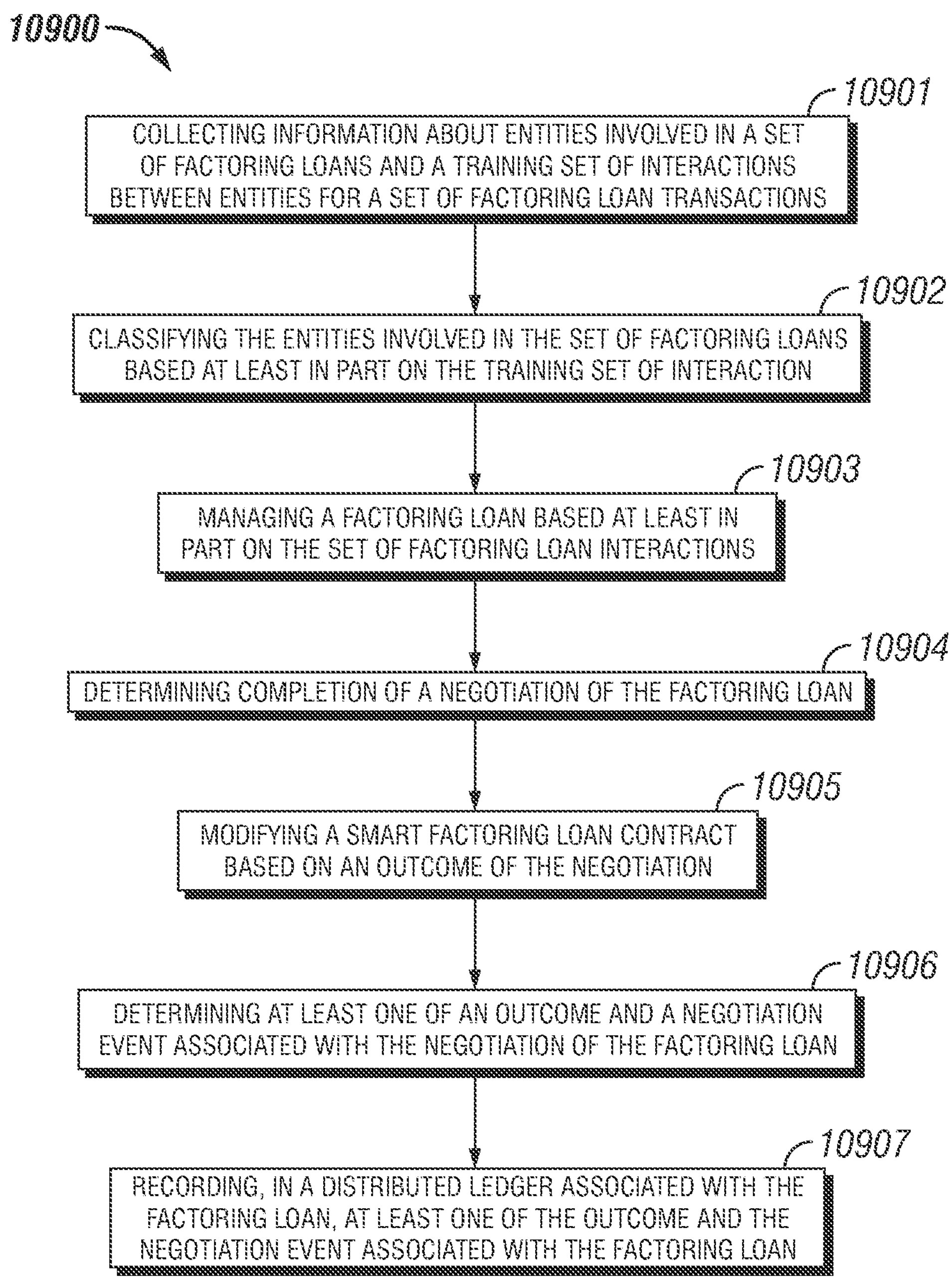
FIG. 109 depicts a loan factoring method.

Referring to FIG. 109, an illustrative and non-limiting example method 10900 is depicted. The example method 10900 may include step 10901 of collecting information about entities involved in a set of factoring loans and a training set of interactions between entities for a set of factoring loan transactions. Entities involved in the set of factoring loans may be classified based at least in part on the training set of loan interactions (step 10902). The method may further include the step 10903 of managing a factoring loan based at least in part on the set of factoring loan interactions.

The method 10900 may further include the step 10904 of determining completion of a negotiation of the factoring loan. Based on the outcome of the negotiations, a smart contract may be modified in step 10905. The method may also include the step 10906 of determining at least one of an outcome and a negotiation event associated with the negotiation of the factoring loan. The at least one of the outcome and the negotiation event may be recorded in a distributed ledger associate with the factoring loan in step 10907.

Figure 110:
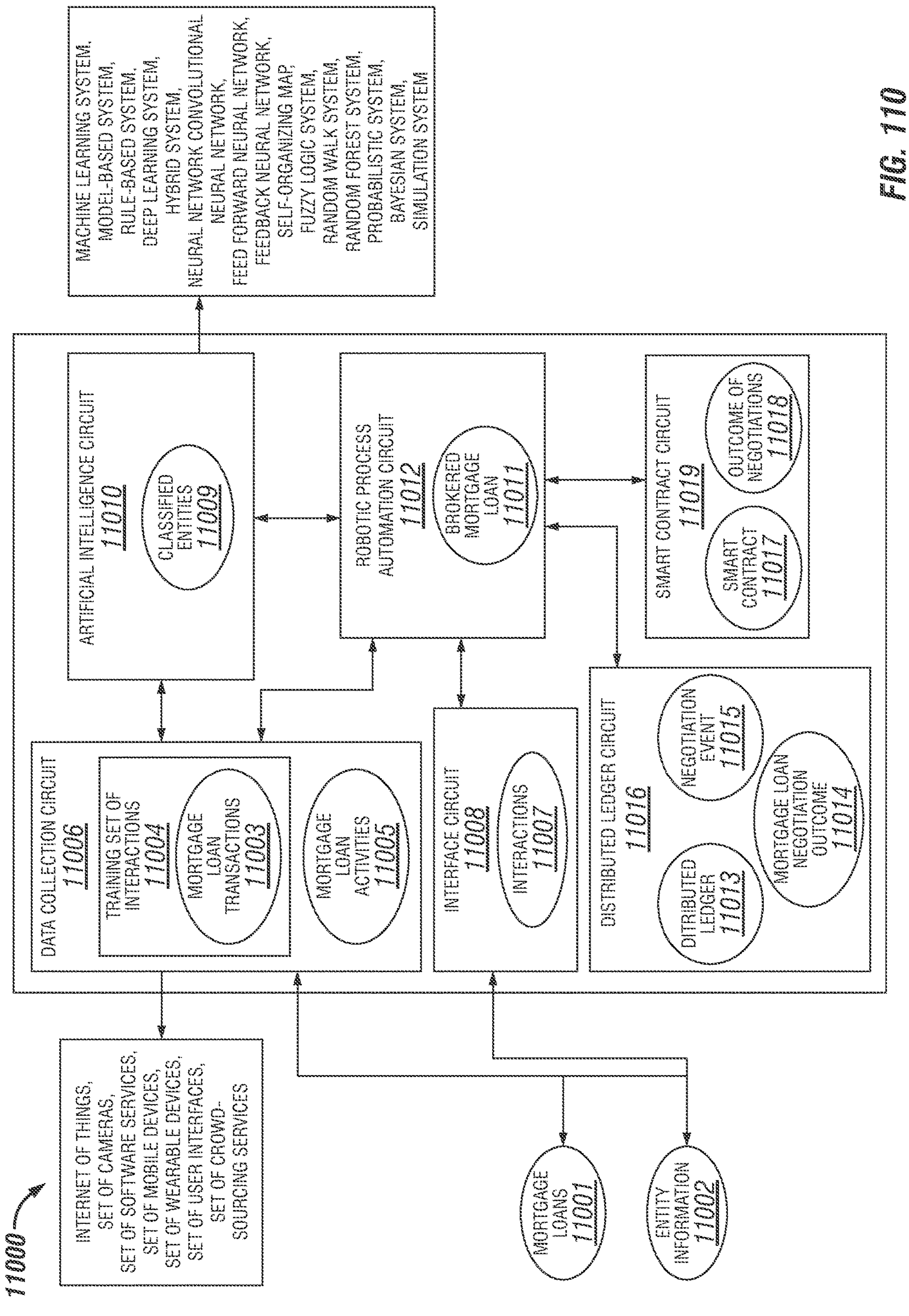
FIG. 110 depicts a system for adaptive intelligence and robotic process automation.

Referring to FIG. 110, an illustrative and non-limiting example system for adaptive intelligence and robotic process automation capabilities 11000 is depicted. The example system may include a data collection circuit 11006, which may collect data information about entities 11002 involved in a set of mortgage loan activities 11005 and a training set of interactions 11004 between entities for a set of mortgage loan transactions 11003. The data may be collected from a variety of sources and systems such as: an Internet of Things system, a camera system, a networked monitoring system, an internet monitoring system, a mobile device system, a wearable device system, a user interface system, and a crowdsourcing system.

The system may also include an artificial intelligence circuit 11010 that may be structured to classify entities 11009 involved in the set of mortgage loan activities based at least in part on the training set of interactions 11004. The artificial intelligence circuit 11010 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 11012 structured to broker a mortgage loan 11011 based at least in part on at least one of the set of mortgage loan activities 11005 and the training set of interactions 11004. The set of mortgage loan activities 11005 and/or the set of mortgage loan transactions 11003 may include activities selected from a group consisting of: among marketing activity, identification of a set of prospective borrowers, identification of property, identification of collateral, qualification of borrower, title search, title verification, property assessment, property inspection, property valuation, income verification, borrower demographic analysis, identification of capital providers, determination of available interest rates, determination of available payment terms and conditions, analysis of existing mortgage, comparative analysis of existing and new mortgage terms, completion of application workflow, population of fields of application, preparation of mortgage agreement, completion of schedule to mortgage agreement, negotiation of mortgage terms and conditions with capital provider, negotiation of mortgage terms and conditions with borrower, transfer of title, placement of lien, or closing of mortgage agreement.

The artificial intelligence circuit 11010 may further include a model that may be used to process attributes of entities involved in the set of mortgage loan activities; the attributes may properties that are subject to mortgages, assets used for collateral, identity of a party, interest rate, payment balance, payment terms, payment schedule, type of mortgage, type of property, financial condition of party, payment status, condition of property, or value of property. In embodiments, brokering the mortgage loan comprises at least one activity such as managing at least one of a property that is subject to a mortgage, identification of candidate mortgages from a set of borrower situations, preparation of a mortgage offer, preparation of content communicating a mortgage offer, scheduling a mortgage offer, communicating a mortgage offer, negotiating a modification of a mortgage offer, preparing a mortgage agreement, executing a mortgage agreement, modifying collateral for a set of mortgage loans, handing transfer of a lien, handling an application workflow, managing an inspection, managing an assessment of a set of assets to be subject to a mortgage, setting an interest rate, deferring a payment requirement, setting a payment schedule, closing a mortgage agreement, and the like In embodiments, at least one entity of the entities 11002 may be a party to at least one mortgage loan transactions of the set of mortgage loan transactions 11003. The party may include least one such as a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, an accountant, and the like.

The system may further include an interface circuit 11008 structured to receive interactions 11007 from one or more of the entities 11002. In some embodiments, the robotic process automation circuit 11012 may be trained on the interactions 11007.

The system may further include a smart contract circuit 11019 structured to determine a completion of a negotiations of the mortgage loan and modify a smart contract 11017 based on an outcome of the negotiation 11018.

The system may further include a distributed ledger circuit 11016 structured to determine at least one of an outcome 11014 or a negotiation event 11015 associated with the negotiation of the mortgage loan. The distributed ledger circuit 11016 may be structured to record, in a distributed ledger 11013 associated with the mortgage loan, the event 11015 and/or the outcome 11014.

Figure 111:
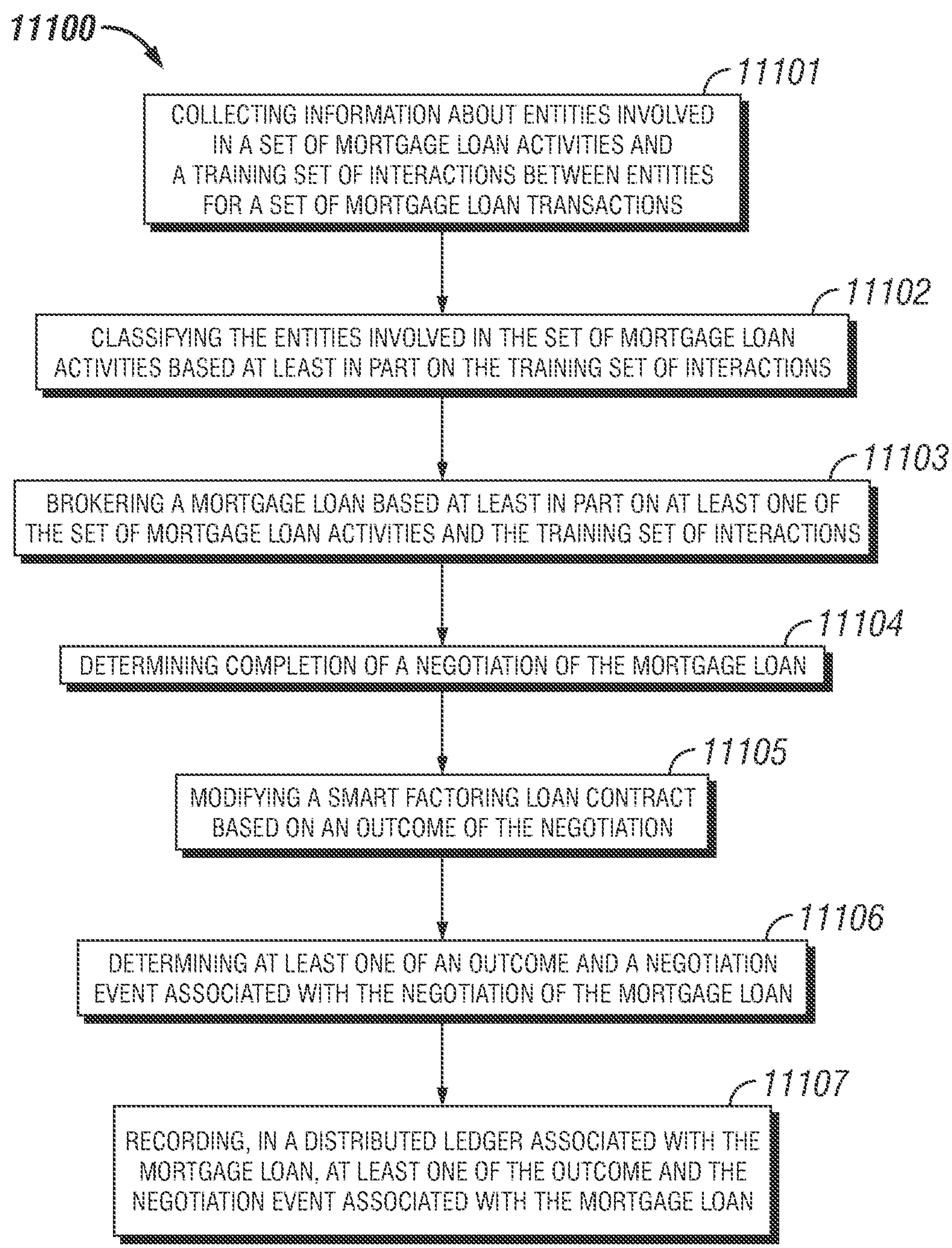
FIG. 111 depicts a mortgage brokering method.

Referring to FIG. 111, an illustrative and non-limiting example method 11100 is depicted. The example method 11100 may include step 11101 of collecting information about entities involved in a set of mortgage loan activities and a training set of interactions between entities for a set of mortgage loan transactions. Entities involved in the set of factoring loans may be classified based at least in part on the training set of loan interactions (step 11102). The method may further include the step 11103 of brokering a mortgage loan based at least in part on at least one of the set of mortgage loan activities and the training set of interactions.

The method 11100 may further include the step 11104 of determining completion of a negotiation of the mortgage loan. Based on the outcome of the negotiations, a smart contract may be modified in step 11105. The method may also include the step 11106 of determining at least one of an outcome and a negotiation event associated with the negotiation of the mortgage loan. The at least one of the outcome and the negotiation event may be recorded in a distributed ledger associate with the mortgage loan in step 11107.

Figure 112:
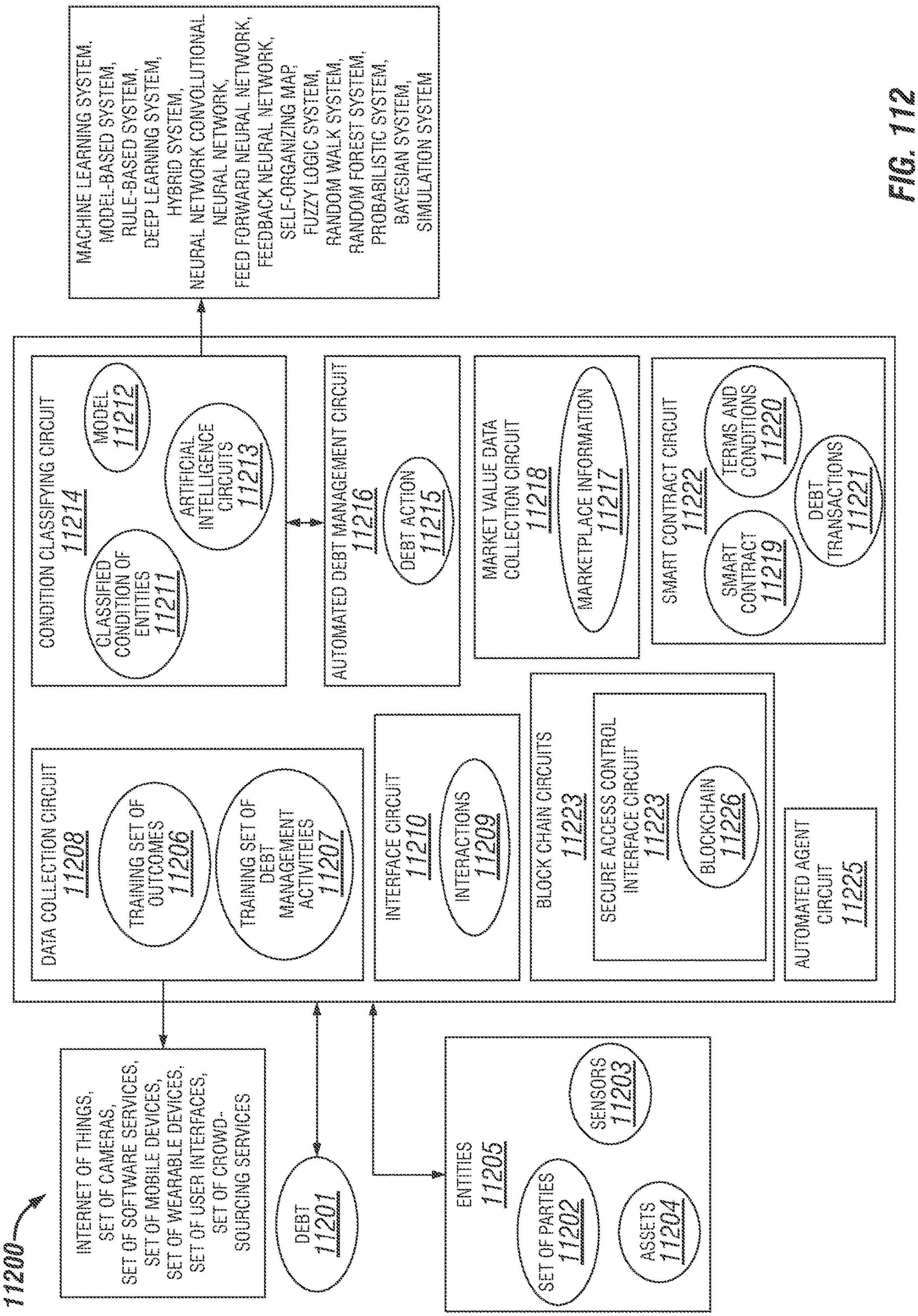
FIG. 112 depicts a system for adaptive intelligence and robotic process automation.

Referring to FIG. 112, an illustrative and non-limiting example system for adaptive intelligence and robotic process automation capabilities 11200 is depicted. The example system may include a data collection circuit 11208, which may collect data about entities 11205 involved in a set of debt transactions 11201, training data set of outcomes 11206 related to the entities, and a training set of debt management activities 11207. The data may be collected from a variety of sources and systems such as: Internet of Things devices, a set of environmental condition sensors, a set of crowdsourcing services, a set of social network analytic services, or a set of algorithms for querying network domains, and the like.

The system may also include a condition classifying circuit 11214 that may be structured to classify a condition 11211 of at least one entity of the entities 11205. The condition classifying circuit 11214 may include a model 11212 and a set of artificial intelligence circuits 11213. The model 11212 may be trained using the training data set of outcomes 11206 related to the entities. The artificial intelligence circuits 11213 may include at least one system such as machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, or a simulation system.

The system may also include an automated debt management circuit 11216 structured to manage an action related to a debt 11215. The automated debt management circuit 11216 may be trained on the training set of debt management activities 11207.

In embodiments, at least one debt transaction of the set of debt transactions 11201 may be include an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like.

In embodiments, the entities 11205 involved in the set of debt transactions may include at least one of set of parties 11202 and a set of assets 11204. The assets 11204 may include a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property. The system may further include a set of sensors 11203 positioned on at least one asset 11204 from the set of assets, on a container for least one asset from the set of assets, and on a package for at least one asset from the set of assets, wherein the set of sensors configured to associate sensor information sensed by the set of sensors with a unique identifier for the at least one asset from the set of assets. The sensors 11203 may include image, temperature, pressure, humidity, velocity, acceleration, rotational, torque, weight, chemical, magnetic field, electrical field, or position sensors.

In embodiments, the system may further include a set of block chain circuits 11224 structured to receive information from the data collection circuit 11208 and the set of sensors 11203 and store the information in a blockchain 11226. The access to the blockchain 11226 may be provided via a secure access control interface circuit 11223.

An automated agent circuit 11225 may be structured to process events relevant to at least one of a value, a condition, and an ownership of at least one asset of the set of assets and further structured to undertake a set of actions related to a debt transaction to which the asset is related.

The system may further include an interface circuit 11210 structured to receive interactions 11209 from at least one of the entities 11205. In embodiments, the automated debt management circuit 11216 may be trained on the interactions 11209. In some embodiments, the system may further include a market value data collection circuit 11218 structured to monitor and report marketplace information 11217 relevant to a value of a of at least one asset of a set of assets 11204. The market value data collection circuit 11218 may be further structured to monitor at least one pricing and financial data for items that are similar to at least one asset in the set of assets in at least one public marketplace. A set of similar items for valuing at least one asset from the set of assets may be constructed using a similarity clustering algorithm based on attributes of the assets. In embodiments, at least one attribute of the attributes of the assets may include a category of assets, asset age, asset condition, asset history, asset storage, geolocation of assets, and the like.

In embodiments, the system may further include a smart contract circuit 11222 structured to manage a smart contract 11219 for a debt transaction 11221. The smart contract circuit 11222 may be further structured to establish a set of terms and conditions 11220 for the debt transaction 11221. At least one of the terms and conditions may include a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, a consequence of default, and the like.

In embodiments, at least one action related to a debt 11215 may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, or consolidating debt. At least one debt management activity from the training set of debt management activities 11207 may include offering a debt transaction, underwriting a debt transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating debt, or consolidating debt.

Figure 113:
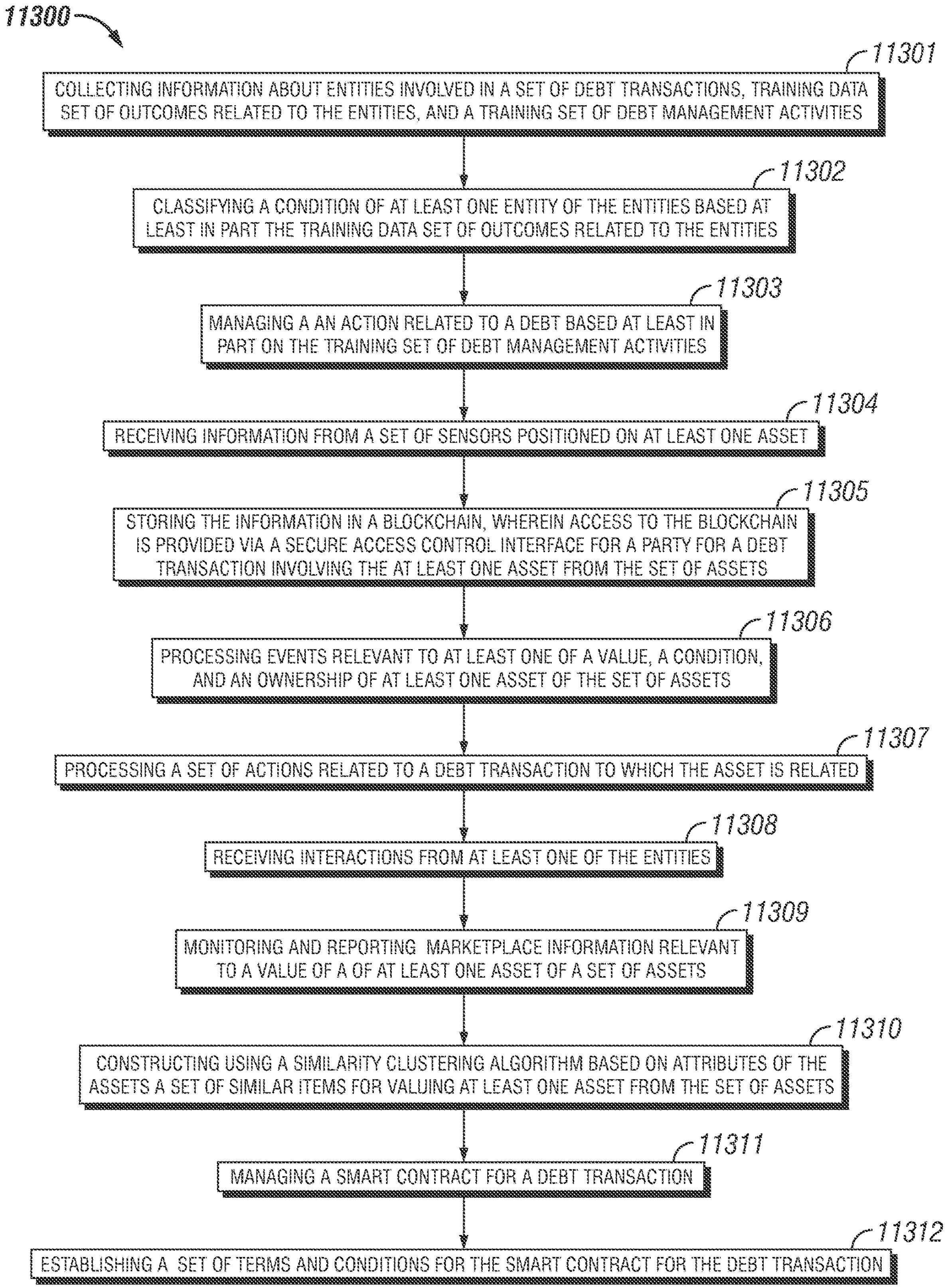
FIG. 113 depicts a method for debt management.

Referring to FIG. 113, an illustrative and non-limiting example method 11300 is depicted. The example method 11300 may include step 11301 of collecting information about entities involved in a set of debt transactions, training data set of outcomes related to the entities, and a training set of debt management activities. The example method may further include classifying a condition of at least one entity of the entities based at least in part the training data set of outcomes related to the entities (step 11302). The example method may further include managing an action related to a debt based at least in part on the training set of debt management activities (step 11303). The example method may further include receiving information from a set of sensors positioned on at least one asset (step 11304). The example method may further include storing the information in a blockchain, wherein access to the blockchain is provided via a secure access control interface for a party for a debt transaction involving the at least one asset from the set of assets (step 11305). In step 11306 the method may include processing events relevant to at least one of a value, a condition, or an ownership of at least one asset of the set of assets. In step 11307 the method may include processing a set of actions related to a debt transaction to which the asset is related. In embodiments, the method may further include receiving interactions from at least one of the entities (step 11308), monitoring and reporting marketplace information relevant to a value of a of at least one asset of a set of assets (step 11309), constructing using a similarity clustering algorithm based on attributes of the assets a set of similar items for valuing at least one asset from the set of assets (step 11310), managing a smart contract for a debt transaction (step 11311), and establishing a set of terms and conditions for the smart contract for the debt transaction (step 11312).

Figure 114:
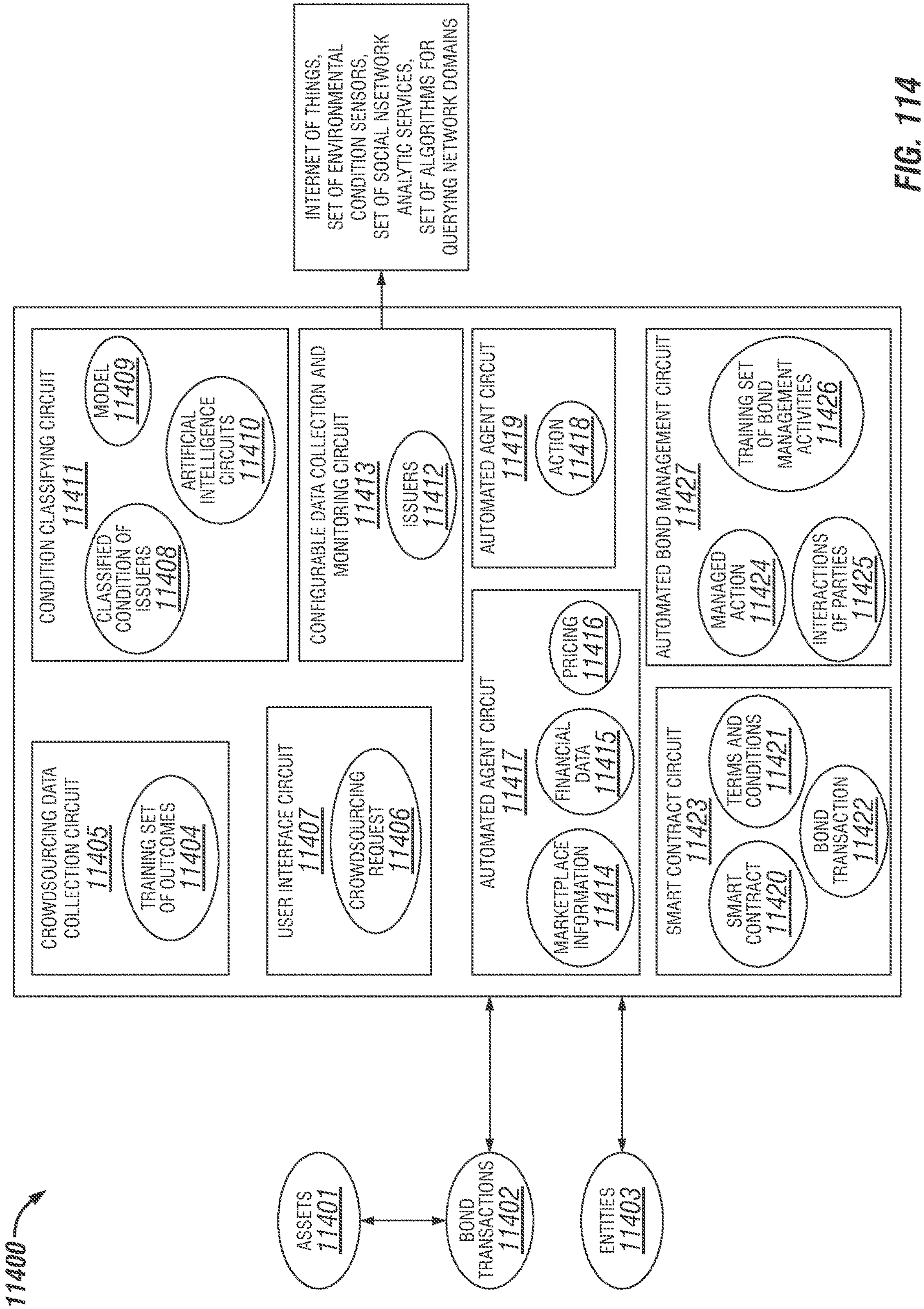
FIG. 114 depicts a system for adaptive intelligence and robotic process automation.

Referring to FIG. 114, an illustrative and non-limiting example system for adaptive intelligence and robotic process automation capabilities 11400 is depicted.

The example system may include a crowdsourcing data collection circuit 11405 structured to collect information about entities 11403 involved in a set of bond transactions 11402 and a training data set of outcomes related to the entities 11403. The system may further include a condition classifying circuit 11411 structured to classify a condition of a set of issuers 11408 using the information from the crowdsourcing data collection circuit 11405 and a model 11409. The model 11409 may be trained using the training data set of outcomes 11404 related to the set of issuers. The example system may further include an automated agent circuit 11419 structured to perform an action related to a debt transaction in response to the classified condition of at least one issuer of the set of issuers. In embodiments, at least one entity 11403 may include a set of issuers, a set of bonds, a set of parties, or a set of assets. At least one issuer may include a municipality, a corporation, a contractor, a government entity, a non-governmental entity, or a non-profit entity. At least one bond may include a municipal bond, a government bond, a treasury bond, an asset-backed bond, or a corporate bond.

In embodiments, the condition classified 11408 by the condition classifying circuit 11411 may include a default condition, a foreclosure condition, a condition indicating violation of a covenant, a financial risk condition, a behavioral risk condition, a policy risk condition, a financial health condition, a physical defect condition, a physical health condition, an entity risk condition, an entity health condition, or the like. The crowdsourcing data collection circuit 11411 may be structured to enable a user interface 11407 by which a user may configure a crowdsourcing request 11406 for information relevant to the condition about the set of issuers.

The system may further include a configurable data collection and monitoring circuit 11413 structured to monitor at least one issuer from the set of issuers 11412. The configurable data collection and monitoring circuit 11413 may include a system such as: Internet of Things devices, a set of environmental condition sensors, a set of social network analytic services, or a set of algorithms for querying network domains. The configurable data collection and monitoring circuit 11413 may be structured to monitor an at least one environment such as: a municipal environment, a corporate environment, a securities trading environment, a real property environment, a commercial facility, a warehousing facility, a transportation environment, a manufacturing environment, a storage environment, a home, or a vehicle.

In embodiments, a set of bonds associated with the set of bond transactions 11402 may be backed by a set of assets 11401. At least one asset 11401 may include a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, or the like.

In embodiments, the system may further include an automated agent circuit 11419 structured to process events relevant to at least one of a value, a condition, or an ownership of at least one asset of the at least one issuer of the set of issuers and to perform the action related to the debt transaction in response to at least one of the processed events.

The action 11418 may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, consolidating debt, and the like. The condition classifying circuit 11411 may include a system such as: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, or a simulation system.

In embodiments, the system may further include an automated bond management circuit 11427 configured to manage an action related to the bond 11424 related to the at least one issuer of the set of issuers. The automated bond management circuit 11427 may be trained on a training set of bond management activities 11426. The automated bond management circuit 11427 may be further trained on a set of interactions of parties 11425 with a set of user interfaces involved in a set of bond transaction activities. At least one bond transaction may include a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, consolidating debt, or the like.

In embodiments, the system may further include a market value data collection circuit 11417 structured to monitor and report on marketplace information 11414 relevant to a value of at least one of the issuer or a set of assets. Reporting may include reporting on: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property. The market value data collection circuit 11417 may be structured to monitor pricing 11416 or financial data 11415 for items that are similar to the assets in at least one public marketplace. The market value data collection circuit 11417 may be further structured to construct a set of similar items for valuing the assets using a similarity clustering algorithm based on attributes of the assets. At least one attribute from the attributes may be selected from: a category of the assets, asset age, asset condition, asset history, asset storage, or geolocation of assets.

In embodiments, the system may further include a smart contract circuit 11423 structured for managing a smart contract 11420 for a bond transaction 11422 in response to the classified condition of the at least one issuer of the set of issuers. The smart contract circuit 11423 may be structured to determine terms and conditions 11421 for the bond. At least one term and condition 11421 may include a principal amount of debt, a balance of debt, a fixed interest rate, a variable interest rate, a payment amount, a payment schedule, a balloon payment schedule, a specification of assets that back the bond, a specification of substitutability of assets, a party, an issuer, a purchaser, a guarantee, a guarantor, a security, a personal guarantee, a lien, a duration, a covenant, a foreclose condition, a default condition, a consequence of default, and the like.

Figure 115:
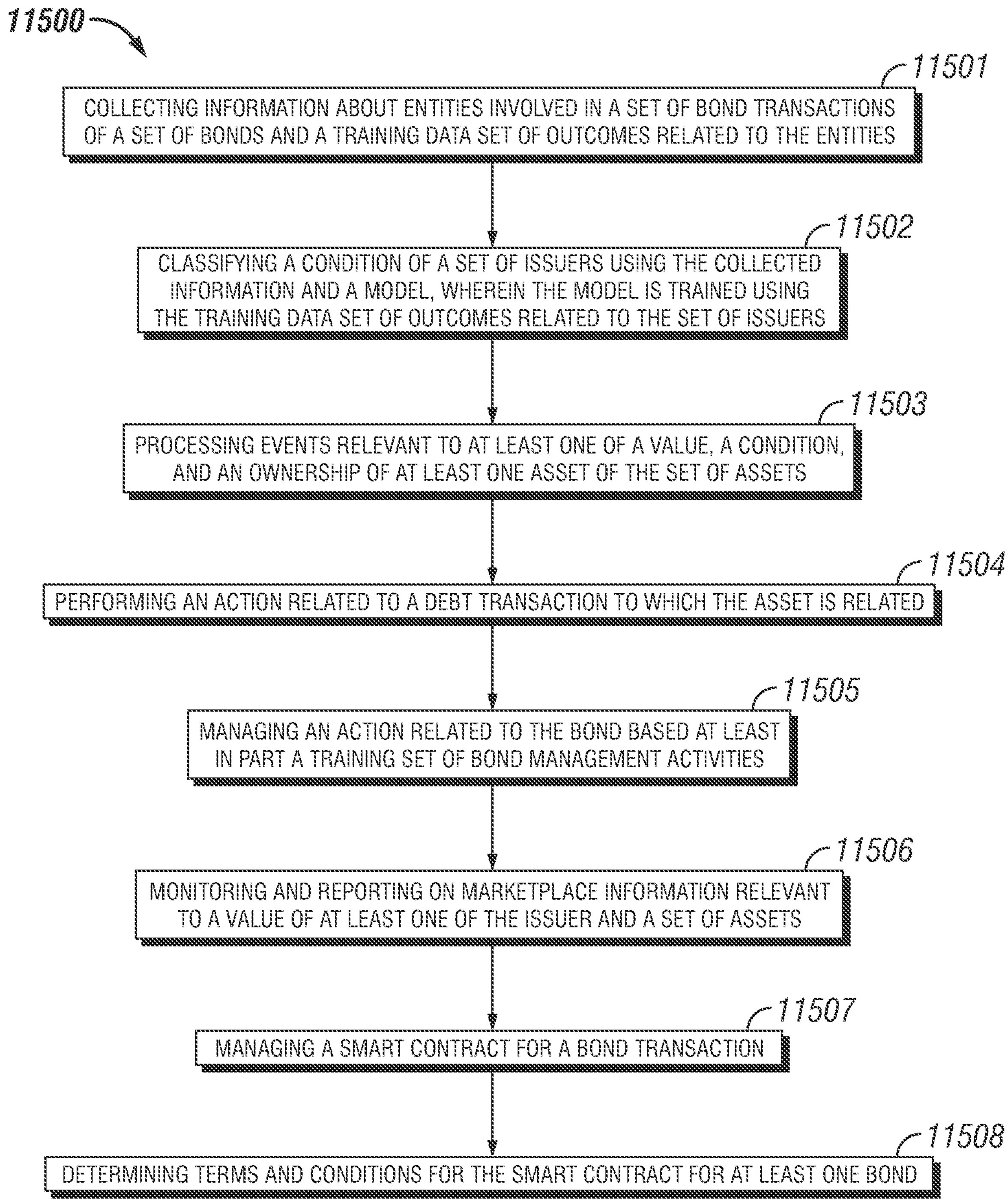
FIG. 115 depicts a method for bond management.

Referring to FIG. 115, an illustrative and non-limiting example method 11500 is depicted. The example method 11500 may include step 11501 of collecting information about entities involved in a set of bond transactions of a set of bonds and a training data set of outcomes related to the entities. The method may further include the step 11502 of classifying a condition of a set of issuers using the collected information and a model, wherein the model is trained using the training data set of outcomes related to the set of issuers. The method may further include processing events relevant to at least one of a value, a condition, or an ownership of at least one asset of the set of assets (step 11503). The method may further include the steps 11504 of performing an action related to a debt transaction to which the asset is related, 11505 managing an action related to the bond based at least in part on a training set of bond management activities, 11506 monitoring and reporting on marketplace information relevant to a value of at least one of the issuer and a set of assets, 11507 managing a smart contract for a bond transaction, and 11508 determining terms and conditions for the smart contract for at least one bond.

Figure 116:
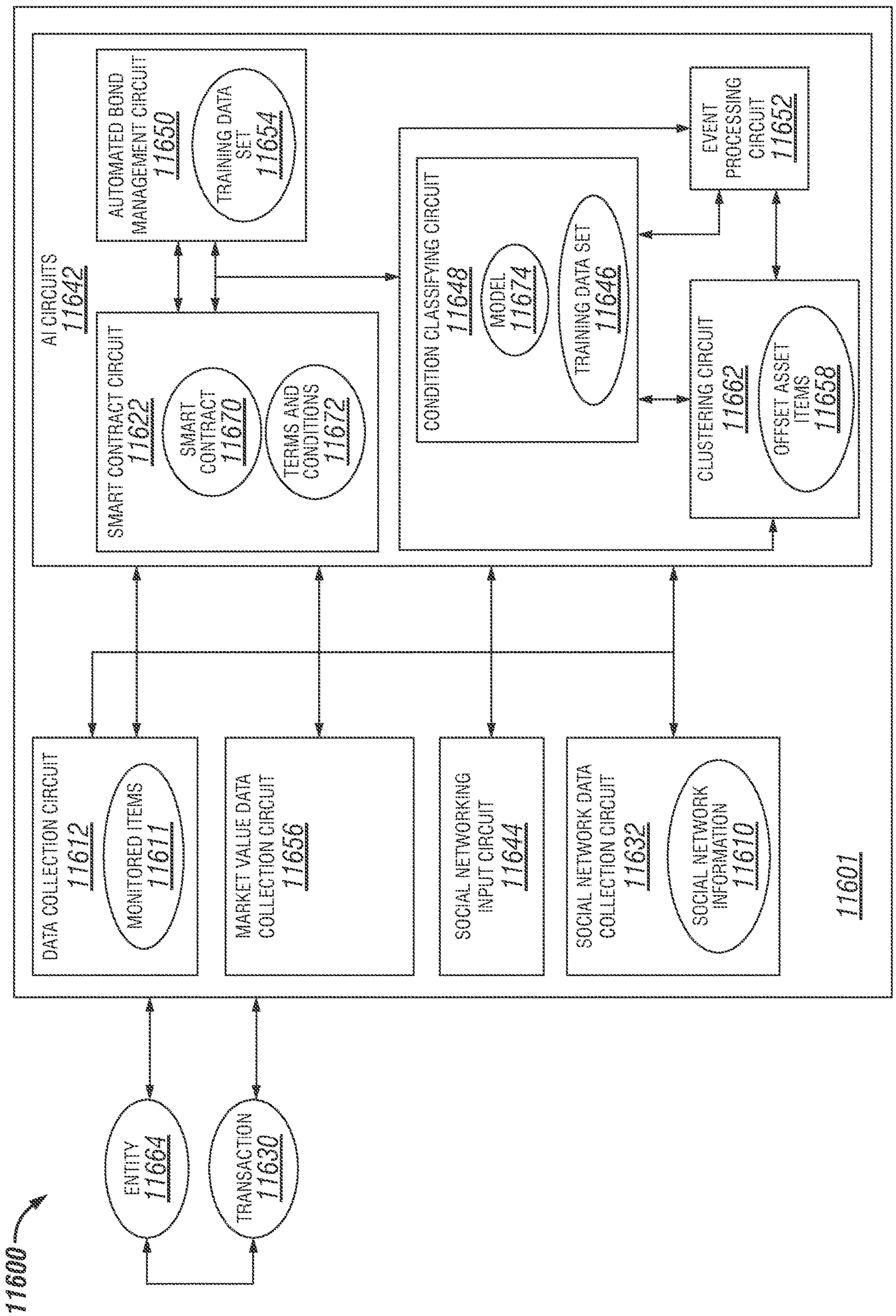
FIG. 116 depicts a system for monitoring a condition of an issuer for a bond.

Referring now to FIG. 116, an illustrative and non-limiting example system for monitoring a condition of an issuer for a bond 11600 is depicted. The example system may include a controller 11601. The controller 11601 may include a data collection circuit 11612, a market value data collection circuit 11656, a social networking input circuit 11644, a social network data collection circuit 11632, and several artificial intelligence circuits 11642 including a smart contract circuit 11622, an automated bond management circuit 11650, a condition classifying circuit 11646, a clustering circuit 11662, and an event processing circuit 11652.

The social network data collection circuit 11632 may be structured to collect information about at least one entity 11664 involved in at least one transaction 11630 comprising at least one bond, and a condition classifying circuit 11646 may be structured to classify a condition of the at least one entity in accordance with a model 11674 and based on information from the social network data collection circuit, wherein the model is trained using a training data set 11654 of a plurality of outcomes related to the at least one entity. The at least one entity may be selected from the entities consisting of: a bond issuer, a bond, a party, and an asset. The bond issuer may be selected from the bond issuers consisting of: a municipality, a corporation, a contractor, a government entity, a non-governmental entity, and a non-profit entity. The bond may be selected from the entities consisting of: a municipal bond, a government bond, a treasury bond, an asset-backed bond, and a corporate bond.

The condition classified by the condition classifying circuit 11648 may be at least one of a default condition, a foreclosure condition, a condition indicating violation of a covenant, a financial risk condition, a behavioral risk condition, a policy risk condition, a financial health condition, a physical defect condition, a physical health condition, an entity risk condition, or an entity health condition.

The social network data collection circuit 11632 may further include a social networking input circuit 11644 which may be structured to receive input from a user used to configure a query for information about the at least one entity.

The data collection circuit 11612 may be structured to monitor at least one of an Internet of Things device, an environmental condition sensor, a crowdsourcing request circuit, a crowdsourcing communication circuit, a crowdsourcing publishing circuit, and an algorithm for querying network domains.

The data collection circuit 11612 may be further structured to monitor an environment selected from the group consisting of: a municipal environment, a corporate environment, a securities trading environment, a real property environment, a commercial facility, a warehousing facility, a transportation environment, a manufacturing environment, a storage environment, a home, and a vehicle.

The at least one bond is backed by at least one asset. The at least one asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The event processing circuit 11652 may be structured to process an event relevant to at least one of a value, a condition, and an ownership of the at least one asset and undertake an action related to the at least one transaction. The action may be selected from the actions consisting of:

a bond transaction, underwriting a bond transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The condition classifying circuit 11648 may further include a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

The automated bond management circuit 11650 may be structured to manage an action related to the at least one bond, wherein the automated bond management circuit is trained on a training data set of a plurality of bond management activities.

The automated bond management circuit 11650 may be trained on a plurality of interactions of parties with a plurality of user interfaces involved in a plurality of bond transaction activities. The plurality of bond transaction activities may be selected from the bond transaction activities consisting of: offering a bond transaction, underwriting a bond transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The market value data collection circuit 11656 may be structured to monitor and report on marketplace information relevant to a value of at least one of a bond issuer, the at least one bond, and an asset. The asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The market value data collection circuit 11656 may be further structured to monitor pricing or financial data for an offset asset item in at least one public marketplace.

A set of offset asset items 11658 for valuing the asset may be constructed using a clustering circuit 11662 based on an attribute of the asset. The attribute may be selected from the attributes consisting of: a category, an asset age, an asset condition, an asset history, an asset storage, and a geolocation.

The smart contract circuit 11622 may be structured to manage a smart contract for the at least one transaction. The smart contract circuit may be further structured to determine a terms and conditions for the at least one bond.

The terms and conditions may be selected from the group consisting of: a principal amount of debt, a balance of debt, a fixed interest rate, a variable interest rate, a payment amount, a payment schedule, a balloon payment schedule, a specification of assets that back the at least one bond, a specification of substitutability of assets, a party, an issuer, a purchaser, a guarantee, a guarantor, a security, a personal guarantee, a lien, a duration, a covenant, a foreclose condition, a default condition, and a consequence of default.

Figure 117:
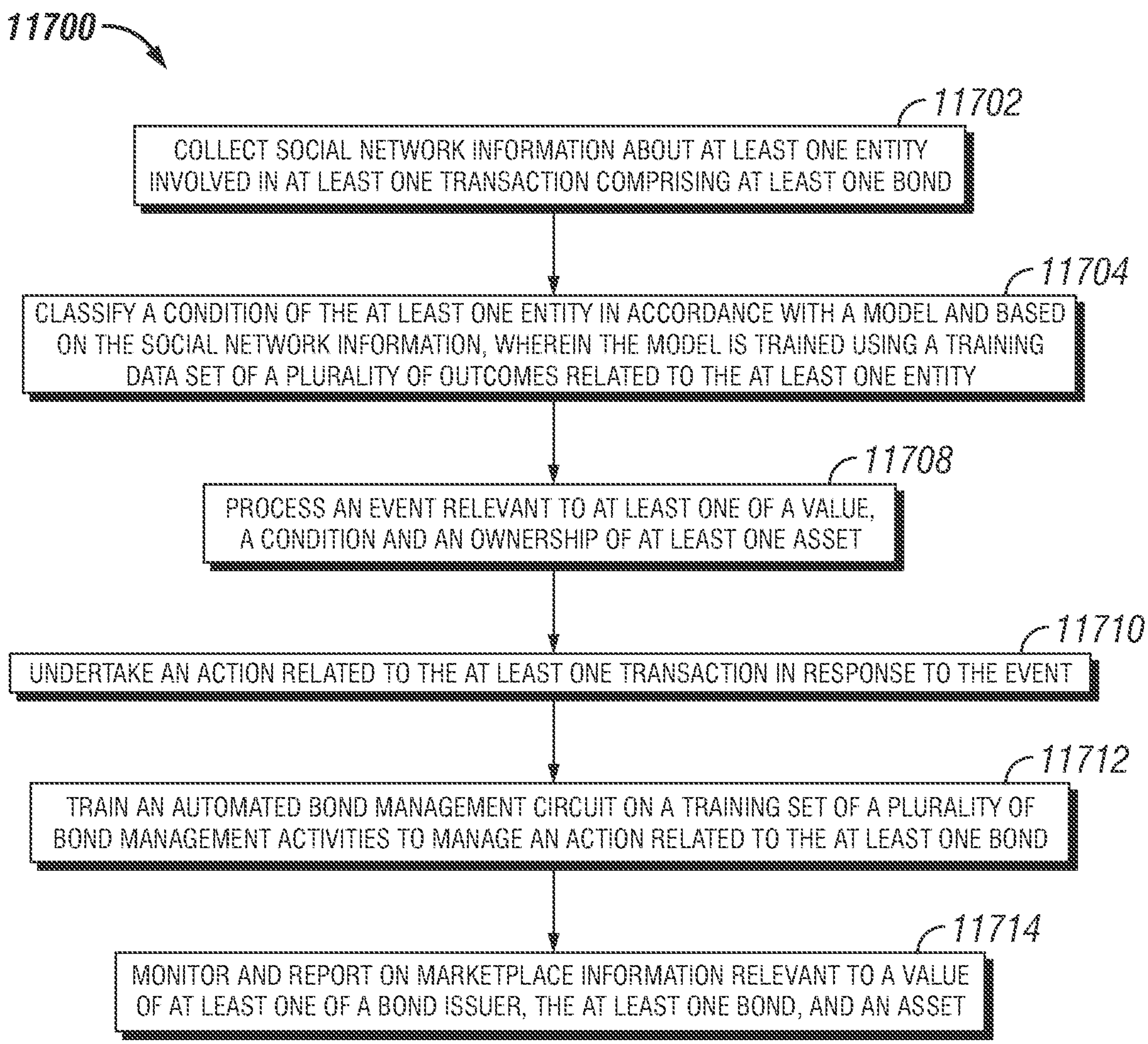
FIG. 117 depicts a method for monitoring a condition of an issuer for a bond

Referring now to FIG. 117, an illustrative and non-limiting example method for monitoring a condition of an issuer for a bond 11700 is depicted. An example method may include collecting social network information about at least one entity involved in at least one transaction comprising at least one bond 11702 and classifying a condition of the at least one entity in accordance with a model and based on the social network information, wherein the model is trained using a training data set of a plurality of outcomes related to the at least one entity 11704.

An event relevant to at least one of a value, a condition, and an ownership of at least one asset may be processed 11708. An action related to the at least one transaction may be undertaken in response to the event 11710. An automated bond management circuit may be trained on a training set of a plurality of bond management activities to manage an action related to the at least one bond 11712. An example method may further include monitoring and reporting on marketplace information relevant to a value of at least one of a bond issuer, the at least one bond, and an asset 11714.

Figure 118:
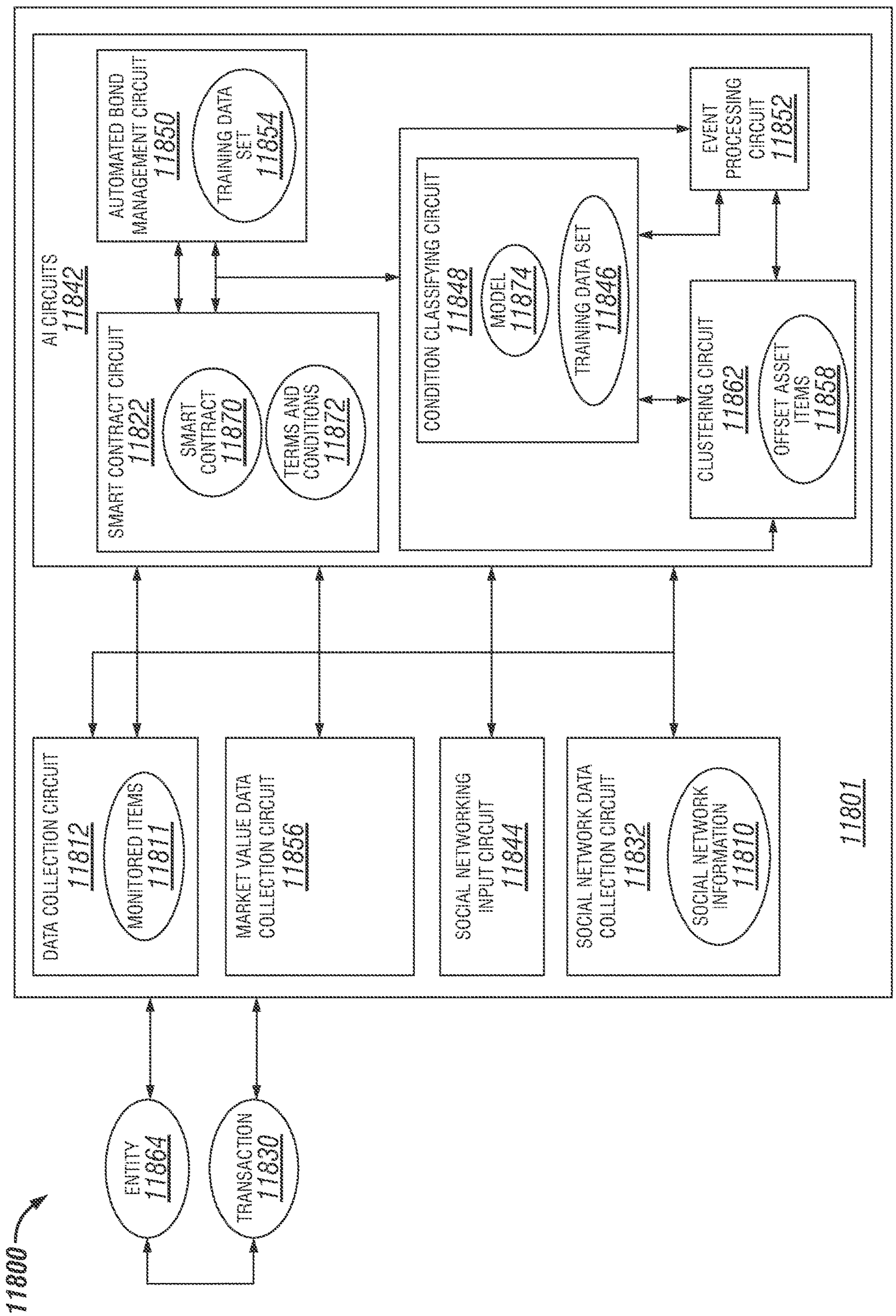
FIG. 118 depicts a system for monitoring a condition of an issuer for a bond.

Referring now to FIG. 118, an illustrative and non-limiting example system for monitoring a condition of an issuer for a bond 11800 is depicted. The example system may include a controller 11801. The controller 11801 may include a data collection circuit 11812, a market value data collection circuit 11856, an Internet of Things input circuit 11844, an Internet of Things data collection circuit 11832, and several artificial intelligence circuits 11842 including a smart contract circuit 11822, an automated bond management circuit 11850, a condition classifying circuit 11846, a clustering circuit 11862, and an event processing circuit 11852.

The Internet of Things data collection circuit 11832 may be structured to collect information about at least one entity 11864 involved in at least one transaction 11830 comprising at least one bond and a condition classifying circuit 11846 may be structured to classify a condition of the at least one entity in accordance with a model 11874 and based on information from the Internet of Things data collection circuit, wherein the model is trained using a training data set 11854 of a plurality of outcomes related to the at least one entity. The at least one entity may be selected from the entities consisting of: a bond issuer, a bond, a party, and an asset. The bond issuer may be selected from the bond issuers consisting of: a municipality, a corporation, a contractor, a government entity, a non-governmental entity, and a non-profit entity. The bond may be selected from the entities consisting of: a municipal bond, a government bond, a treasury bond, an asset-backed bond, and a corporate bond.

The condition classified by the condition classifying circuit 11848 may be at least one of a default condition, a foreclosure condition, a condition indicating violation of a covenant, a financial risk condition, a behavioral risk condition, a policy risk condition, a financial health condition, a physical defect condition, a physical health condition, an entity risk condition, or an entity health condition.

The Internet of Things data collection circuit 11832 may further include an Internet of Things input circuit 11844 which may be structured to receive input from a user used to configure a query for information about the at least one entity.

The data collection circuit 11812 may be structured to monitor at least one of an Internet of Things device, an environmental condition sensor, a crowdsourcing request circuit, a crowdsourcing communication circuit, a crowdsourcing publishing circuit, and an algorithm for querying network domains.

The data collection circuit 11812 may be further structured to monitor an environment selected from the group consisting of: a municipal environment, a corporate environment, a securities trading environment, a real property environment, a commercial facility, a warehousing facility, a transportation environment, a manufacturing environment, a storage environment, a home, and a vehicle.

The at least one bond is backed by at least one asset. The at least one asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The event processing circuit 11852 may be structured to process an event relevant to at least one of a value, a condition, and an ownership of the at least one asset and undertake an action related to the at least one transaction. The action may be selected from the actions consisting of: a bond transaction, underwriting a bond transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The condition classifying circuit 11848 may further include a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

The automated bond management circuit 11850 may be structured to manage an action related to the at least one bond, wherein the automated bond management circuit is trained on a training data set of a plurality of bond management activities.

The automated bond management circuit 11850 may be trained on a plurality of interactions of parties with a plurality of user interfaces involved in a plurality of bond transaction activities. The plurality of bond transaction activities may be selected from the bond transaction activities consisting of: offering a bond transaction, underwriting a bond transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The market value data collection circuit 11856 may be structured to monitor and report on marketplace information relevant to a value of at least one of a bond issuer, the at least one bond, and an asset. The asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The market value data collection circuit 11856 may be further structured to monitor pricing or financial data for an offset asset item in at least one public marketplace.

A set of offset asset items 11858 for valuing the asset may be constructed using a clustering circuit 11862 based on an attribute of the asset. The attribute may be selected from the attributes consisting of: a category, an asset age, an asset condition, an asset history, an asset storage, and a geolocation.

The smart contract circuit 11822 may be structured to manage a smart contract for the at least one transaction. The smart contract circuit may be further structured to determine a terms and conditions for the at least one bond.

The terms and conditions may be selected from the group consisting of: a principal amount of debt, a balance of debt, a fixed interest rate, a variable interest rate, a payment amount, a payment schedule, a balloon payment schedule, a specification of assets that back the at least one bond, a specification of substitutability of assets, a party, an issuer, a purchaser, a guarantee, a guarantor, a security, a personal guarantee, a lien, a duration, a covenant, a foreclose condition, a default condition, and a consequence of default.

Figure 119:
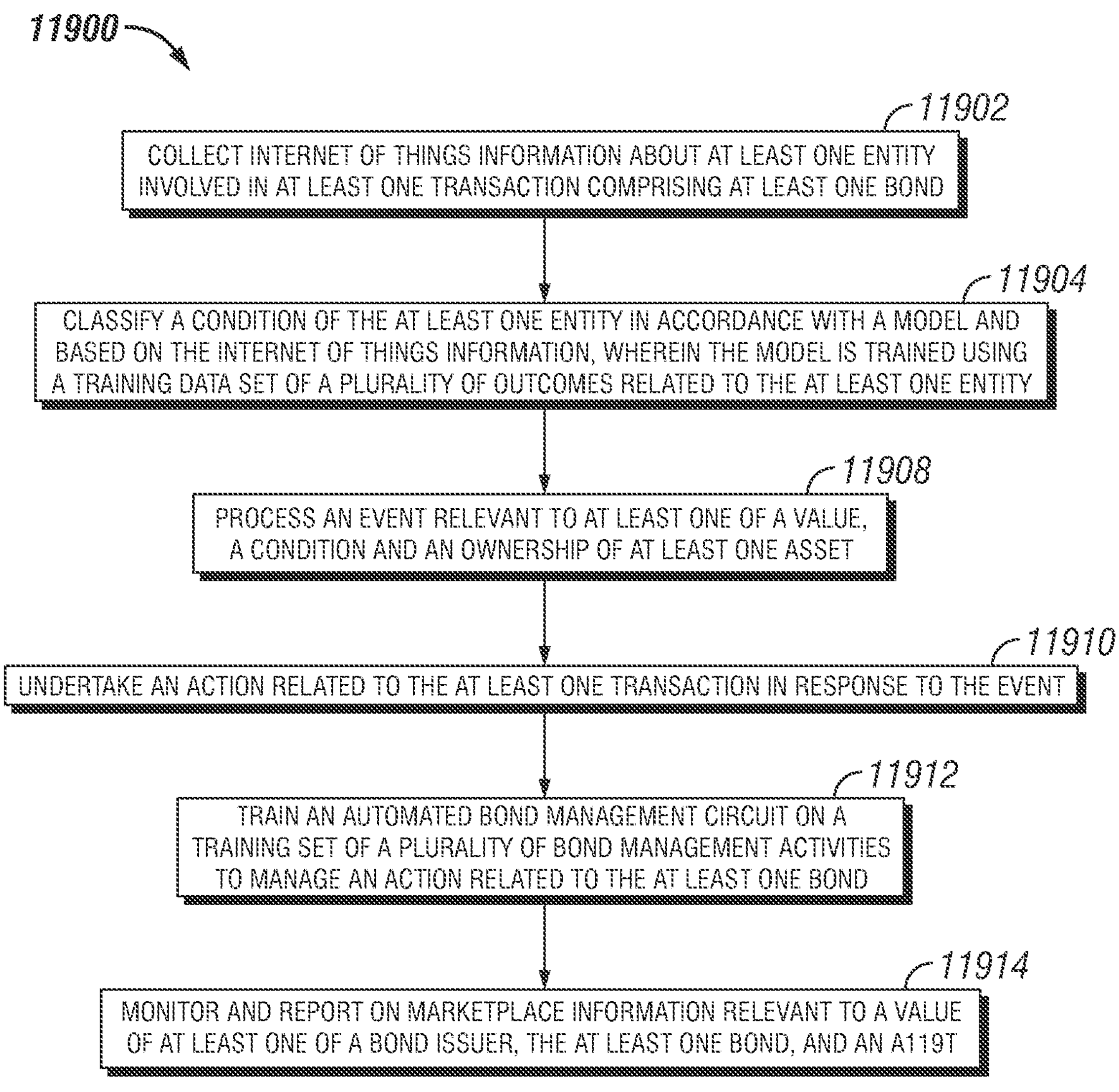
FIG. 119 depicts a method for monitoring a condition of an issuer for a bond.

Referring now to FIG. 119, an illustrative and non-limiting example method for monitoring a condition of an issuer for a bond 11900 is depicted. An example method may include collecting Internet of Things information about at least one entity involved in at least one transaction comprising at least one bond 11902 and classifying a condition of the at least one entity in accordance with a model and based on the Internet of Things information, wherein the model is trained using a training data set of a plurality of outcomes related to the at least one entity 11904.

An event relevant to at least one of a value, a condition, and an ownership of at least one asset may be processed 11908. An action related to the at least one transaction may be undertaken in response to the event 11910. An automated bond management circuit may be trained on a training set of a plurality of bond management activities to manage an action related to the at least one bond 11912. An example method may further include monitoring and reporting on marketplace information relevant to a value of at least one of a bond issuer, the at least one bond, and an asset 11914.

Figure 120:
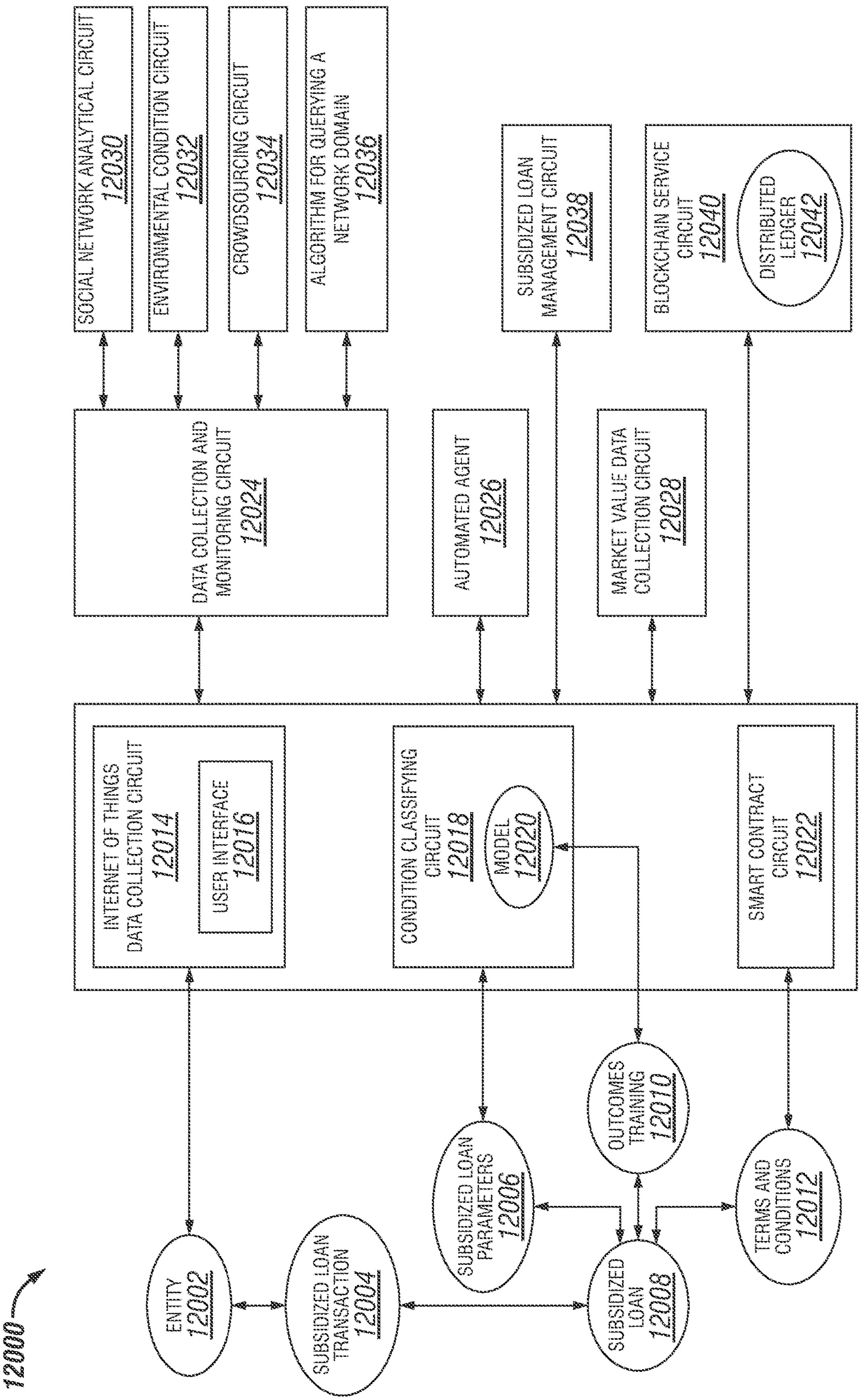
FIG. 120 depicts a system for automatic subsidized loan management.

FIG. 120 depicts a system 12000 including an Internet of Things data collection circuit 12014 structured to collect information about an entity 12002 (e.g., where an entity may be a subsidized loan, a party, a subsidy, a guarantor, a subsidizing party, a collateral, and the like, where a party may be least one of a municipality, a corporation, a contractor, a government entity, a non-governmental entity, and a non-profit entity) involved in a subsidized loan transaction 12004. In embodiments, the Internet of Things data collection circuit may include a user interface 12016 structured to enable a user to configure a query for information about the at least one entity. The system may include a condition classifying circuit 12018 that may include a model 12020 structured to classify a parameter 12006 of a subsidized loan 12008 (e.g., municipal subsidized loan, a government subsidized loan, a student loan, an asset-backed subsidized loan, or a corporate subsidized loan) involved in a subsidized loan transaction, such as based on the information from the Internet of Things data collection circuit. In embodiments, the condition classifying circuit may include a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, a simulation system, and the like. The subsidized loan may be backed by an asset, such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, and the like. The condition classified by the condition classifying circuit may be a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, an entity health condition, and the like. The model may be trained using a training data set of a plurality of outcomes 12010 related to the subsidized loan. For instance, the subsidized loan may be a student loan and the condition classifying circuit may classify a progress of a student toward a degree, a participation of a student in a non-profit activity, a participation of a student in a public interest activity, and the like. The system may include a smart contract circuit 12022 structured to automatically modify terms and conditions 12012 of the subsidized loan, such as based on the classified parameter from the condition classifying circuit. The system may include a configurable data collection and circuit 12024 structured to monitor the entity, such as further including a social network analytic circuit 12030, an environmental condition circuit 12032, a crowdsourcing circuit 12034, and an algorithm for querying a network domain 12036, where the configurable data collection and circuit may monitor an environment selected from an environment, such as a municipal environment, an educational environment, a corporate environment, a securities trading environment, a real property environment, a commercial facility, a warehousing facility, a transportation environment, a manufacturing environment, a storage environment, a home, a vehicle, and the like. The system may include an automated agent 12026 structured to process an event relevant to a value, a condition and an ownership of the asset, and undertake an action related to the subsidized loan transaction to which the asset is related, wherein the action may be a subsidized loan transaction, underwriting a subsidized loan transaction, setting an interest rate, deferring a payment requirement, modifying an interest rate, validating a title, managing an inspection, recording a change in a title, assessing the value of an asset, calling a loan, closing a transaction, setting terms and conditions for a transaction, providing notices required to be provided, foreclosing on a set of assets, modifying terms and conditions, setting a rating for an entity, syndicating a subsidized loan, consolidating a subsidized loan, and the like. The system may include an automated subsidized loan management circuit 12038 structured to manage an action related to the at least one subsidized loan, wherein the automated subsidized loan management circuit is trained on a training set of subsidized loan management activities. For instance, the automated subsidized loan management circuit may be trained on a plurality of interactions of parties with a plurality of user interfaces involved in a plurality of subsidized loan transaction activities, where the plurality of subsidized loan transaction activities may be selected from the activities consisting of offering a subsidized loan transaction, underwriting a subsidized loan transaction, setting an interest rate, deferring a payment requirement, modifying an interest rate, validating a title, managing an inspection, recording a change in a title, assessing a value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan. The system may include a blockchain service circuit 12040 structured to record the modified set of terms and conditions for a subsidized loan, such as in a distributed ledger 12042. The system may include a market value data collection circuit 12028 structured to monitor and report on marketplace information relevant to a value of an issuer, a subsidized loan, an asset, and the like, where reporting may be on an asset selected from the assets consisting of a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property. The market value data collection circuit may be further structured to monitor pricing or financial data for an offset asset item in a public marketplace. A set of offset asset items for valuing the asset may be constructed using a clustering circuit based on an attribute of the asset, where the attribute may be a category, an asset age, an asset condition, an asset history, an asset storage, a geolocation, and the like. The smart contract circuit may be structured to manage a smart contract for a subsidized loan transaction, where the smart contract circuit may set terms and conditions for the subsidized loan, where the terms and conditions for the subsidized loan that are specified and managed by the smart contract circuit may include a principal amount of debt, a balance of debt, a fixed interest rate, a variable interest rate, a payment amount, a payment schedule, a balloon payment schedule, a specification of assets that back the at least one subsidized loan, a specification of substitutability of assets, a party, an issuer, a purchaser, a guarantee, a guarantor, a security, a personal guarantee, a lien, a duration, a covenant, a foreclose condition, a default condition, a consequence of default, and the like.

Figure 121:
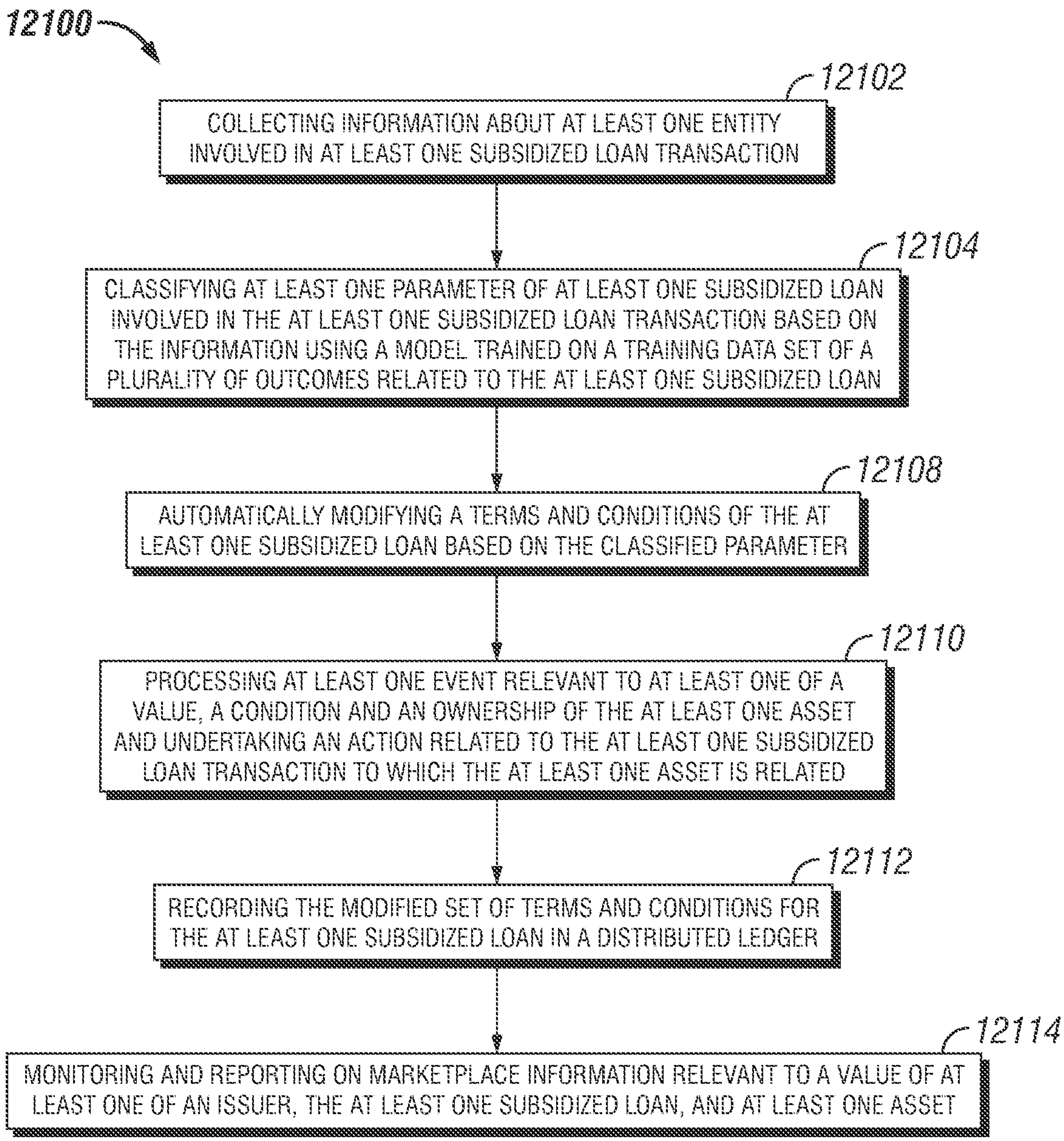
FIG. 121 depicts a method for automatically modifying subsidized loan terms and conditions.

FIG. 121 depicts a method 12100 including collecting information about an entity involved in a subsidized loan transaction 12102. The method may include classifying a parameter of a subsidized loan involved in the subsidized loan transaction based on the information using a model trained on a training data set of a plurality of outcomes related to the at least one subsidized loan 12104. The method may include automatically modifying terms and conditions of the subsidized loan based on the classified parameter 12108. The method may include processing an event relevant to a value, a condition, and an ownership of an asset and undertaking an action related to the subsidized loan transaction to which the asset is related 12110. The method may include recording the modified set of terms and conditions for the subsidized loan in a distributed ledger 12112. The method may include monitoring and reporting on marketplace information relevant to a value of an issuer, the subsidized loan, the asset, and the like.

Figure 122:
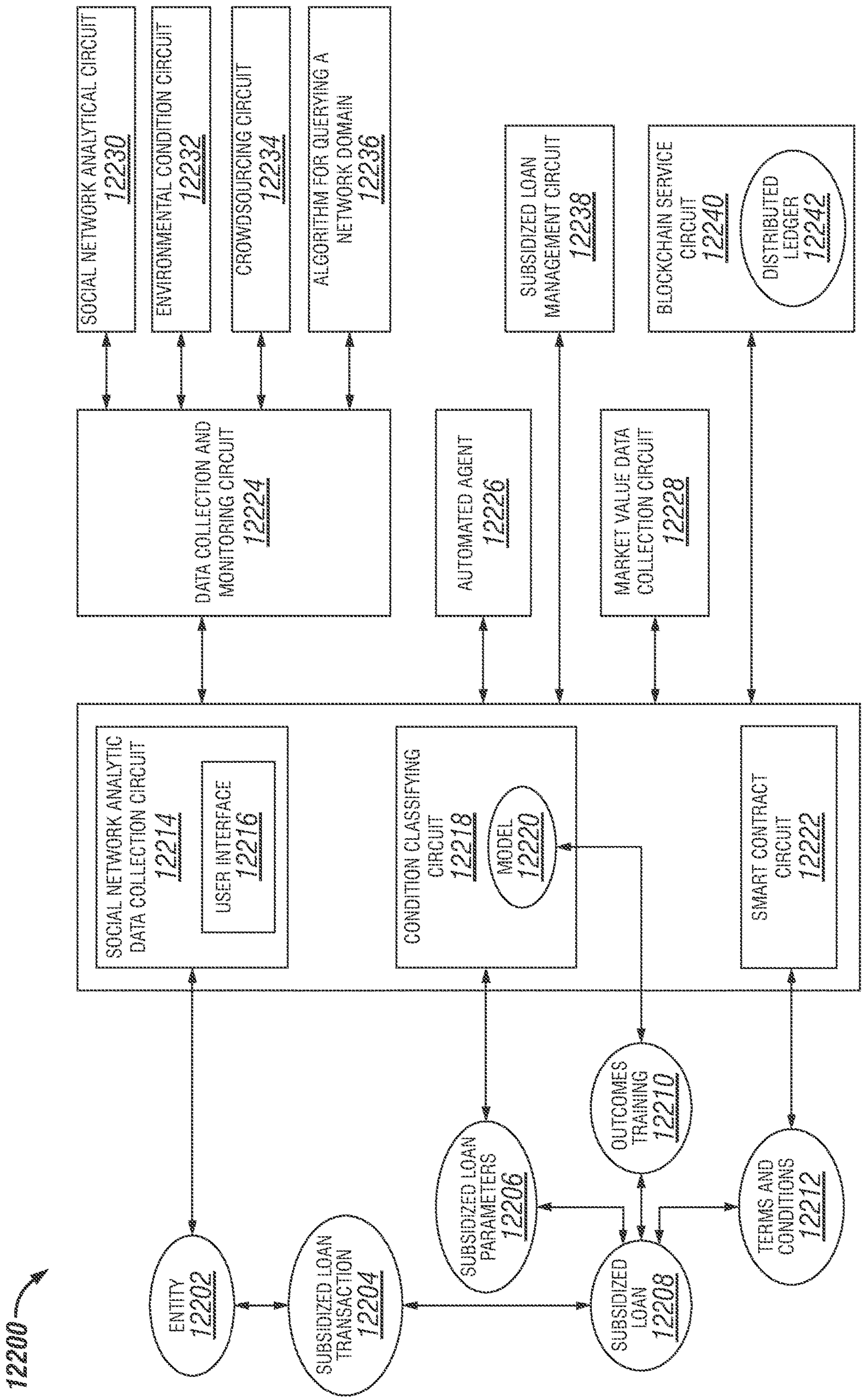
FIG. 122 depicts a system to automatically modify terms and conditions of a loan.

FIG. 122 depicts a system 12200 including a social network analytic data collection circuit 12214 structured to collect social network information about an entity 12202 (e.g., where an entity may be a subsidized loan, a party, a subsidy, a guarantor, a subsidizing party, a collateral, and the like, where a party may be least one of a municipality, a corporation, a contractor, a government entity, a non-governmental entity, and a non-profit entity) involved in a subsidized loan transaction 12204. In embodiments, the social network analytic data collection circuit may include a user interface 12216 structured to enable a user to configure a query for information about the at least one entity, wherein, in response to the query, the social network analytic data collection circuit may initiate at least one algorithm that searches and retrieves data from at least one social network based on the query. The system may include a condition classifying circuit 12218 that may include a model 12220 structured to classify a parameter 12206 of a subsidized loan 12208 (e.g., municipal subsidized loan, a government subsidized loan, a student loan, an asset-backed subsidized loan, or a corporate subsidized loan) involved in a subsidized loan transaction, such as based on the social network information from the social network analytic data collection circuit. In embodiments, the condition classifying circuit may include a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, a simulation system, and the like. The subsidized loan may be backed by an asset, such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, and the like. The parameter classified by the condition classifying circuit may be a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, an entity health condition, and the like. The model may be trained using a training data set of a plurality of outcomes 12210 related to the subsidized loan. For instance, the subsidized loan may be a student loan and the condition classifying circuit may classify a progress of a student toward a degree, a participation of a student in a non-profit activity, a participation of a student in a public interest activity, and the like. The system may include a smart contract circuit 12222 structured to automatically modify terms and conditions 12212 of the subsidized loan, such as based on the classified parameter. The system may include a configurable data collection and circuit 12224 structured to monitor the entity, such as further including a social network analytic circuit 12230, an environmental condition circuit 12232, a crowdsourcing circuit 12234, and an algorithm for querying a network domain 12236, where the configurable data collection and circuit may monitor an environment selected from an environment, such as a municipal environment, an educational environment, a corporate environment, a securities trading environment, a real property environment, a commercial facility, a warehousing facility, a transportation environment, a manufacturing environment, a storage environment, a home, a vehicle, and the like. The system may include an automated agent 12226 structured to process an event relevant to a value, a condition, and an ownership of the asset and undertake an action related to the subsidized loan transaction to which the asset is related, wherein the action may be a subsidized loan transaction, underwriting a subsidized loan transaction, setting an interest rate, deferring a payment requirement, modifying an interest rate, validating a title, managing an inspection, recording a change in a title, assessing the value of an asset, calling a loan, closing a transaction, setting terms and conditions for a transaction, providing notices required to be provided, foreclosing on a set of assets, modifying terms and conditions, setting a rating for an entity, syndicating a subsidized loan, consolidating a subsidized loan, and the like. The system may include an automated subsidized loan management circuit 12238 structured to manage an action related to the at least one subsidized loan, wherein the automated subsidized loan management circuit is trained on a training set of subsidized loan management activities. For instance, the automated subsidized loan management circuit may be trained on a plurality of interactions of parties with a plurality of user interfaces involved in a plurality of subsidized loan transaction activities, where the plurality of subsidized loan transaction activities may be selected from the activities consisting of offering a subsidized loan transaction, underwriting a subsidized loan transaction, setting an interest rate, deferring a payment requirement, modifying an interest rate, validating a title, managing an inspection, recording a change in a title, assessing a value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan. The system may include a blockchain service circuit 12240 structured to record the modified set of terms and conditions for a subsidized loan, such as in a distributed ledger 12242. The system may include a market value data collection circuit 12228 structured to monitor and report on marketplace information relevant to a value of an issuer, a subsidized loan, an asset, and the like, where reporting may be on an asset selected from the assets consisting of a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property. The market value data collection circuit may be further structured to monitor pricing or financial data for an offset asset item in a public marketplace. A set of offset asset items for valuing the asset may be constructed using a clustering circuit based on an attribute of the asset, where the attribute may be a category, an asset age, an asset condition, an asset history, an asset storage, a geolocation, and the like. The smart contract circuit may be structured to manage a smart contract for a subsidized loan transaction, where the smart contract circuit may set terms and conditions for the subsidized loan, where the terms and conditions for the subsidized loan that are specified and managed by the smart contract circuit may include a principal amount of debt, a balance of debt, a fixed interest rate, a variable interest rate, a payment amount, a payment schedule, a balloon payment schedule, a specification of assets that back the at least one subsidized loan, a specification of substitutability of assets, a party, an issuer, a purchaser, a guarantee, a guarantor, a security, a personal guarantee, a lien, a duration, a covenant, a foreclose condition, a default condition, a consequence of default, and the like.

Figure 123:
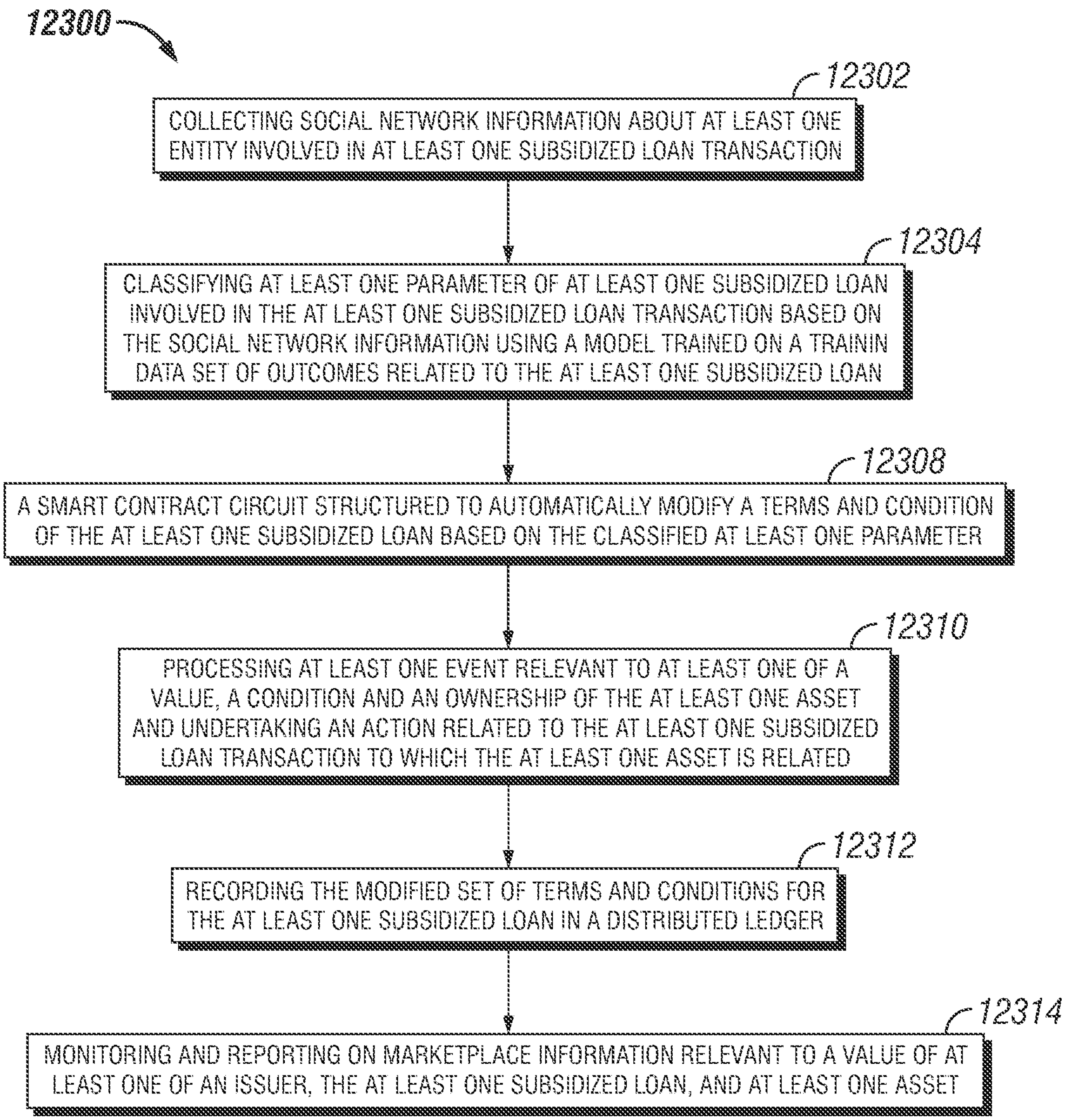
FIG. 123 depicts a method for collecting social network information about an entity involved in a subsidized loan transaction.

FIG. 123 depicts a method 12300 including collecting social network information about an entity involved in a subsidized loan transaction 12302. The method may include classifying a parameter of a subsidized loan involved in the subsidized loan transaction based on the social network information using a model trained on a training data set of a plurality of outcomes related to the at least one subsidized loan 12304. The method may include automatically modifying terms and conditions of the subsidized loan based on the classified parameter 12308. The method may include processing an event relevant to a value, a condition, and an ownership of an asset and undertaking an action related to the subsidized loan transaction to which the asset is related 12310. The method may include recording the modified set of terms and conditions for the subsidized loan in a distributed ledger 12312. The method may include monitoring and reporting on marketplace information relevant to a value of an issuer, the subsidized loan, the asset, and the like.

Figure 124:
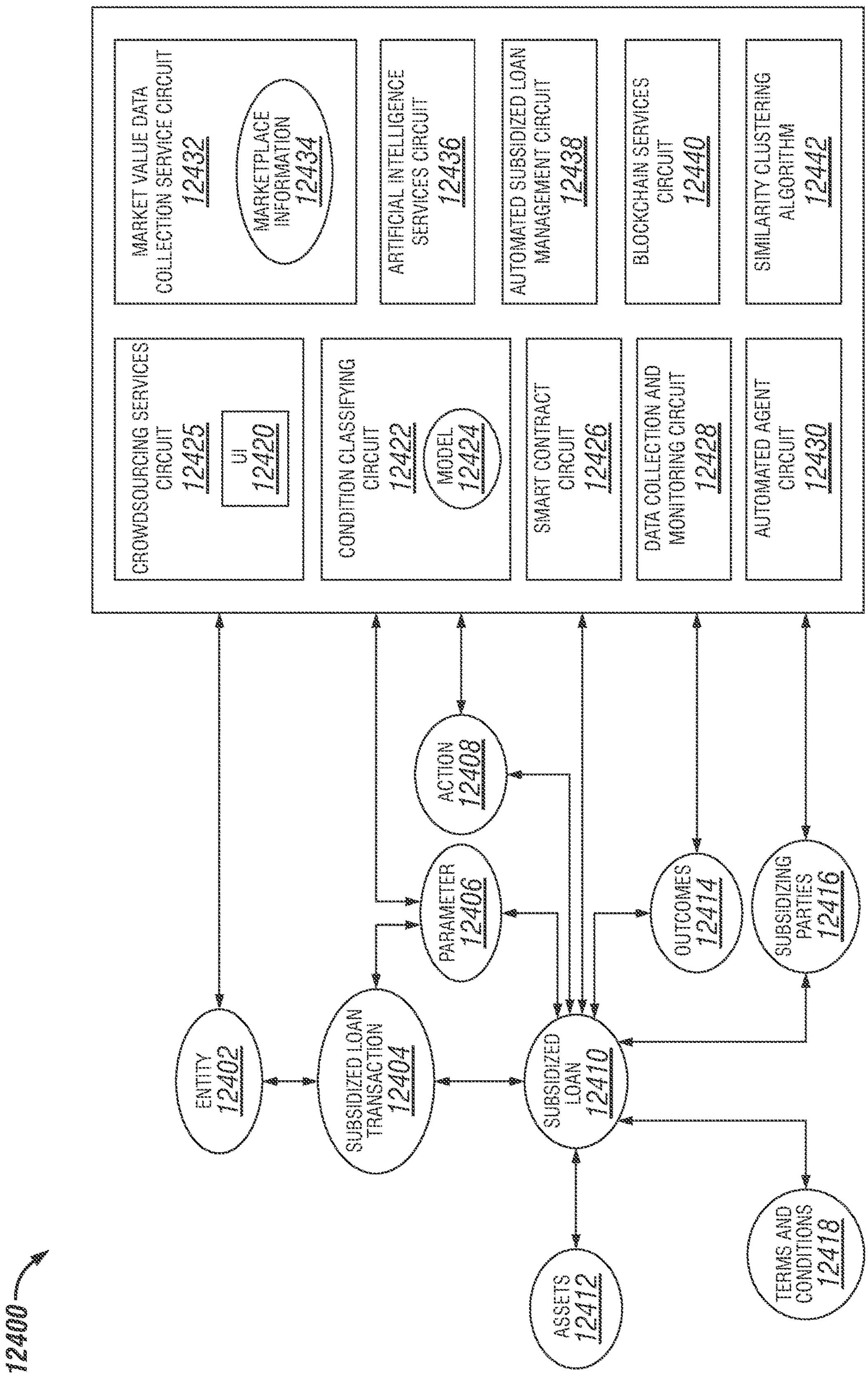
FIG. 124 depicts a system for automating handling of a subsidized loan using crowdsourcing.

FIG. 124 depicts a system 12400 for automating handling of a subsidized loan including a crowdsourcing services circuit 12425 structured to collect information related to a set of entities 12402 involved in a set of subsidized loan transactions 12404. The set of entities may include entities such as a set of subsidized loans, a set of parties 12416, a set of subsidies, a set of guarantors, a set of subsidizing parties, a set of collateral, and the like. A set of subsidizing parties may include a municipality, a corporation, a contractor, a government entity, a non-governmental entity, and a non-profit entity, and the like. The loan may be a student loan and the condition classifying circuit classifies at least one of the progress of a student toward a degree, the participation of a student in a non-profit activity, the participation of the student in a public interest activity, and the like. The crowdsourcing services circuit may be further structured with a user interface 12420 by which a user may configure a query for information about the set of entities and the crowdsourcing services circuit automatically configures a crowdsourcing request based on the query. The set of subsidized loans may be backed by a set of assets 12412, such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, and the like. An example system may include a condition classifying circuit 12422 including a model 12424 and an artificial intelligence services circuit 12436 structured to classify a set of parameters 12406 of the set of subsidized loans 12410 involved in the transactions based on information from crowdsourcing services circuit, where the model may be trained using a training data set of outcomes 12414 related to subsidized loans. The set of subsidized loans may include at least one of a municipal subsidized loan, a government subsidized loan, a student loan, an asset-backed subsidized loan, and a corporate subsidized loan. The condition classified by the condition classifying circuit may be a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, an entity health condition, and the like. The artificial intelligence services circuit may include a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, a simulation system, and the like. An example system may include a smart contract circuit 12426 for automatically modifying the terms and conditions 12418 of a subsidized loan based on the classified set of parameters from the condition classifying circuit. The smart contract services circuit may be utilized for managing a smart contract for the subsidized loan transaction, set terms and conditions for the subsidized loan, and the like. In embodiments, the set of terms and conditions for the debt transaction that are specified and managed by the smart contract services circuit may be selected from among a principal amount of debt, a balance of debt, a fixed interest rate, a variable interest rate, a payment amount, a payment schedule, a balloon payment schedule, a specification of assets that back the subsidized loan, a specification of substitutability of assets, a party, an issuer, a purchaser, a guarantee, a guarantor, a security, a personal guarantee, a lien, a duration, a covenant, a foreclose condition, a default condition, and a consequence of default. An example system may include a configurable data collection and monitoring services circuit 12428 for monitoring the entities such as a set of Internet of Things services, a set of environmental condition sensors, a set of social network analytic services, a set of algorithms for querying network domains, and the like. The configurable data collection and monitoring services circuit may be further structured to monitor an environment such as a municipal environment, an educational environment, a corporate environment, a securities trading environment, a real property environment, a commercial facility, a warehousing facility, a transportation environment, a manufacturing environment, a storage environment, a home, a vehicle, and the like. An example system may include an automated agent circuit 12430 structured to process events relevant to at least one of the value, the condition, and the ownership of the assets and undertakes an action related to a subsidized loan transaction to which the asset is related, such as where the action may be a subsidized loan transaction, underwriting a subsidized loan transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating subsidized loans, consolidating subsidized loans, and the like. An example system may include an automated subsidized loan management circuit 12438 structured to manage an action related to the subsidized loan, where the automated subsidized loan management circuit may be trained on a training set of subsidized loan management activities. The automated subsidized loan management circuit may be trained on a set of interactions of parties with a set of user interfaces involved in a set of subsidized loan transaction activities, such as offering a subsidized loan transaction, underwriting a subsidized loan transaction, setting an interest rate, deferring a payment requirement, modifying an interest rate, validating title, managing inspection, recording a change in title, assessing the value of an asset, calling a loan, closing a transaction, setting terms and conditions for a transaction providing notices required to be provided, foreclosing on a set of assets, modifying terms and conditions, setting a rating for an entity, syndicating subsidized loans, consolidating subsidized loans, and the like. An example system may include a blockchain services circuit 12440 structured to record the modified set of terms and conditions for the set of subsidized loans in a distributed ledger. An example system may include a market value data collection service circuit 12432 structured to monitor and report on marketplace information 12434 relevant to the value of at least one of a party, a set of subsidized loans, and a set of assets, where reporting may be on a set of assets such as one of a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property. The market value data collection service circuit may be further structured to monitor pricing or financial data for items that are similar to the assets in at least one public marketplace. In embodiments, a set of similar items for valuing the assets may be constructed using a similarity clustering algorithm 12442 based on the attributes of the assets, such as from among a category of the assets, asset age, asset condition, asset history, asset storage, geolocation of assets, and the like.

Figure 125:
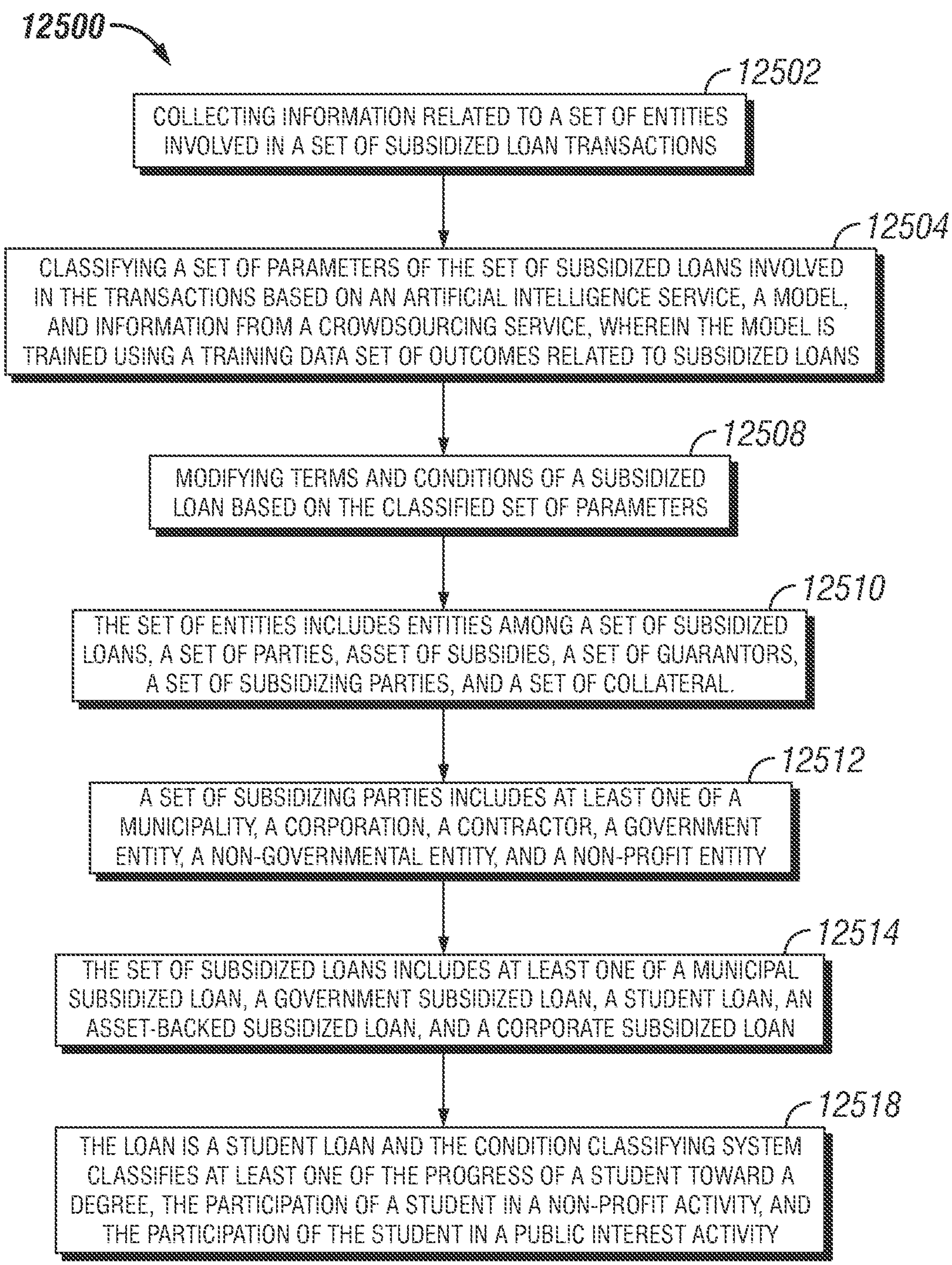
FIG. 125 depicts a method for automating handling of a subsidized loan.

FIG. 125 depicts a method 12500 for automating handling of a subsidized loan including collecting information related to a set of entities involved in a set of subsidized loan transactions 12502, classifying a set of parameters of the set of subsidized loans involved in the transactions based on an artificial intelligence service, a model, and information from a crowdsourcing service, where the model is trained using a training data set of outcomes related to subsidized loans 12504; and modifying terms and conditions of a subsidized loan based on the classified set of parameters 12508. The set of entities may include entities among a set of subsidized loans, a set of parties, a set of subsidies, a set of guarantors, a set of subsidizing parties, and a set of collateral 12510. A set of subsidizing parties may include a municipality, a corporation, a contractor, a government entity, a non-governmental entity, and a non-profit entity 12512. The set of subsidized loans may include a municipal subsidized loan, a government subsidized loan, a student loan, an asset-backed subsidized loan, and a corporate subsidized loan 12514. The loan may be a student loan where the condition classifying system classifies at least one of the progress of a student toward a degree, the participation of a student in a non-profit activity, and the participation of the student in a public interest activity 12518.

Figure 126:
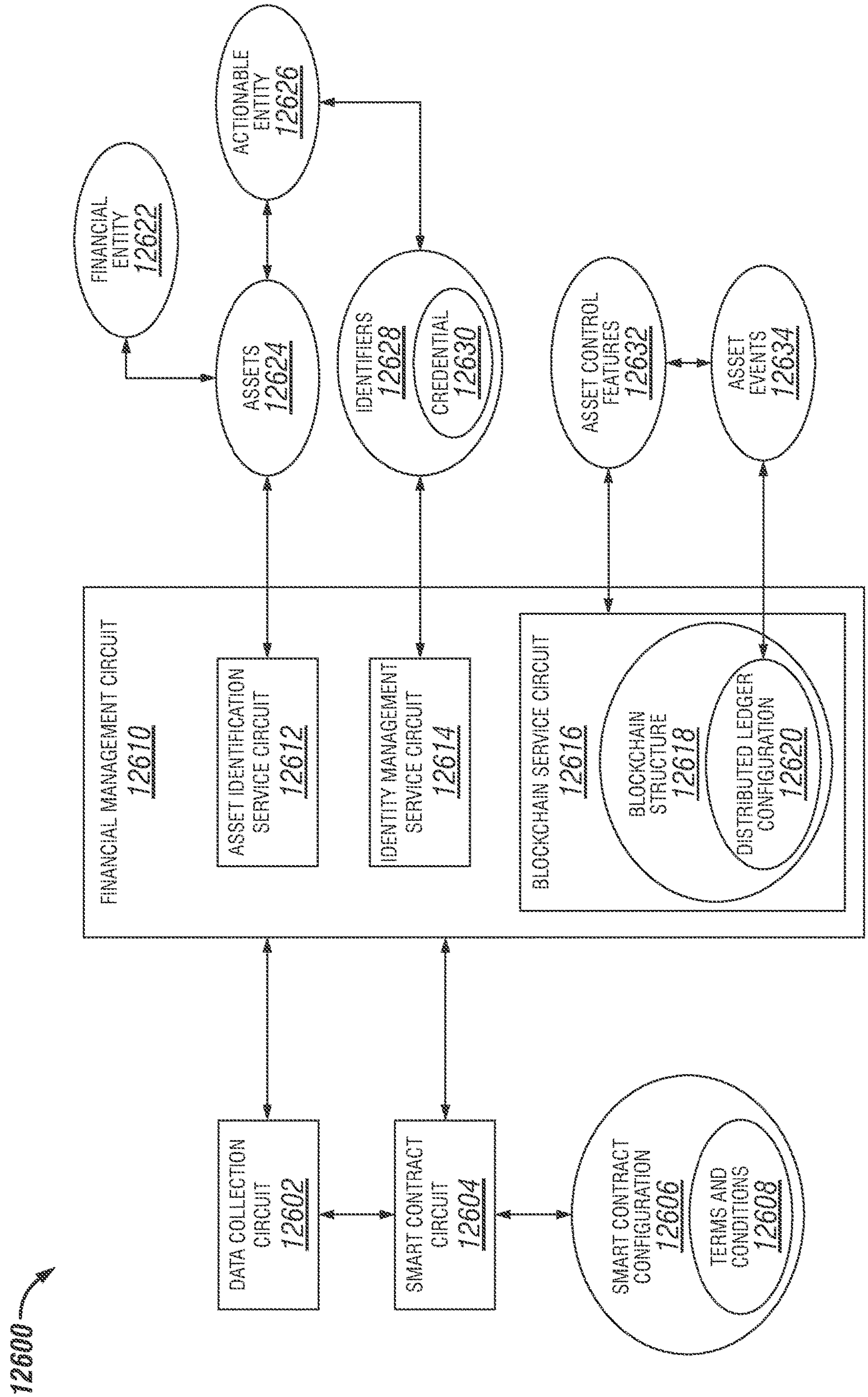
FIG. 126 depicts a system for asset access control.

FIG. 126 depicts a system including an asset identification service circuit 12612 structured to interpret assets 12624 corresponding to a financial entity 12622 configured to take custody of the assets (e.g., identifying assets for which a bank may take custody), where an identity management service circuit 12614 may be structured to authenticate identifiers 12628 (e.g., including a credential 12630) corresponding to actionable entities 12626 (e.g., an owner, a beneficiary, an agent, a trustee, a custodian, and the like) entitled to take action with respect to the assets. For example, a group of financial entities may have permissions with respect to actions to be taken with respect to an asset. A blockchain service circuit 12616 may be structured to store a plurality of asset control features 12632 in a blockchain structure 12618, where the blockchain structure may include a distributed ledger configuration 12620. For instance, transactional events may be stored in a distributed ledger in the blockchain structure where the financial entity and actionable entities may have distributed access through the blockchain structure to share and distribute the asset events. A financial management circuit 12610 may be structured to communicate the interpreted assets and authenticated identifiers to the blockchain service circuit for storage in the blockchain structure as asset control features, wherein the asset control features are recorded in the distributed ledger configuration as asset events 12634 (e.g., a transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, a designation of an ownership status, and the like). A data collection circuit 12602 may be structured to monitor the interpretation of the plurality of assets, authentication of the plurality of identifiers, and the recording of asset events, where the data collection circuit may be communicatively coupled with an Internet of Things system, a camera system, a networked monitoring system, an internet monitoring system, a mobile device system, a wearable device system, a user interface system, and an interactive crowdsourcing system. A smart contract circuit 12604 may be structured to manage the custody of the assets, where an asset event related to the plurality of assets may be managed by the smart contract circuit based on terms and conditions 12608 embodied in a smart contract configuration 12606 and based on data collected by the data collection service circuit. In embodiments, the asset identification service circuit, identity management service circuit, blockchain service circuit, and the financial management circuit may include a corresponding application programming interface (API) component structured to facilitate communication among the circuits of the system, such as where the corresponding API components of the circuits further include user interfaces structured to interact with users of the system.

Figure 127:
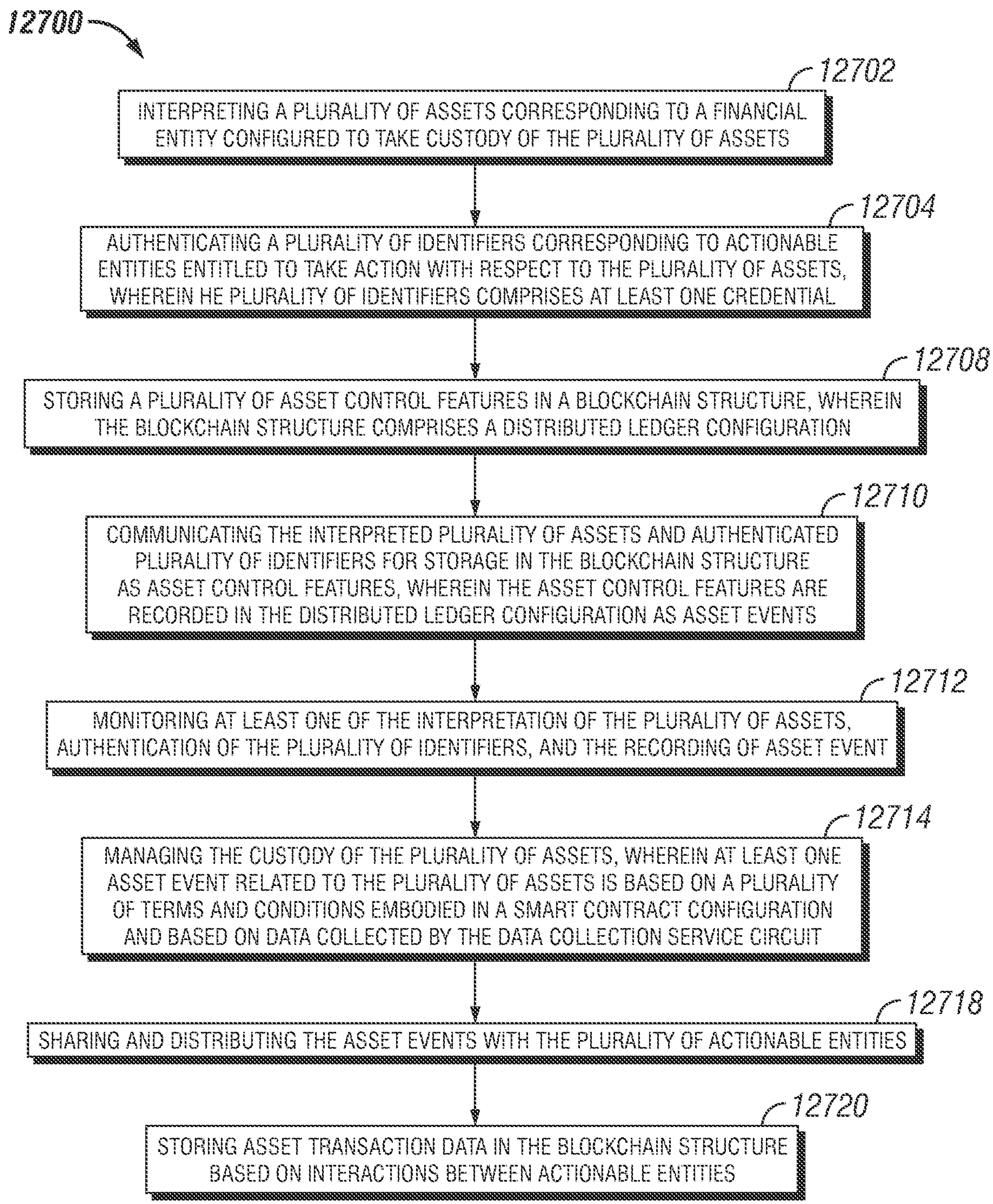
FIG. 127 depicts a method for asset access control.

FIG. 127 depicts a method including interpreting assets corresponding to a financial entity configured to take custody of the plurality of assets 12702, such as where the interpreting of the assets may include identifying the plurality of assets for which a financial entity is responsible for taking custody. The method may include authenticating identifiers (e.g., including a credential) corresponding to actionable entities (e.g., owner, a beneficiary, an agent, a trustee, and a custodian) entitled to take action with respect to the plurality of assets 12704, such as where authenticating the identifiers includes verifying the identifiers corresponding to actionable entities are entitled to take action with respect to the assets. The method may include storing a plurality of asset control features in a blockchain structure (e.g., including a distributed ledger configuration) 12708 (e.g., the blockchain structure may be provided in conjunction with a block-chain marketplace, utilize an automated blockchain-based transaction application, the blockchain structure may be a distributed blockchain structure across a plurality of asset nodes, and the like). The method may include communicating the interpreted assets and authenticated identifiers for storage in the blockchain structure as asset control features, where the asset control features may be recorded in the distributed ledger configuration as asset events 12710. The method may include monitoring the interpretation of the assets, authentication of the identifiers, and the recording of asset events 12712, such as where asset events may include transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, and designation of an ownership status. In embodiments, monitoring may be executed by an Internet of Things system, a camera system, a networked monitoring system, an internet monitoring system, a mobile device system, a wearable device system, a user interface system, an interactive crowdsourcing system, and the like. The method may include managing the custody of the assets, where an asset event related to the plurality of assets may be based on terms and conditions embodied in a smart contract configuration and based on data collected by a data collection service circuit 12714. The method may include sharing and distributing the asset events with the plurality of actionable entities 12718. The method may include storing asset transaction data in the blockchain structure based on interactions between actionable entities 12720. An asset may include a virtual asset tag where interpreting the assets comprises identifying the virtual asset tag (e.g., storing of the asset control features may include storing virtual asset tag data, such as where the virtual asset tag data is location data, tracking data, and the like). For instance, an identifier corresponding to the financial entity or actionable entities may be stored as virtual asset tag data.

Figure 128:
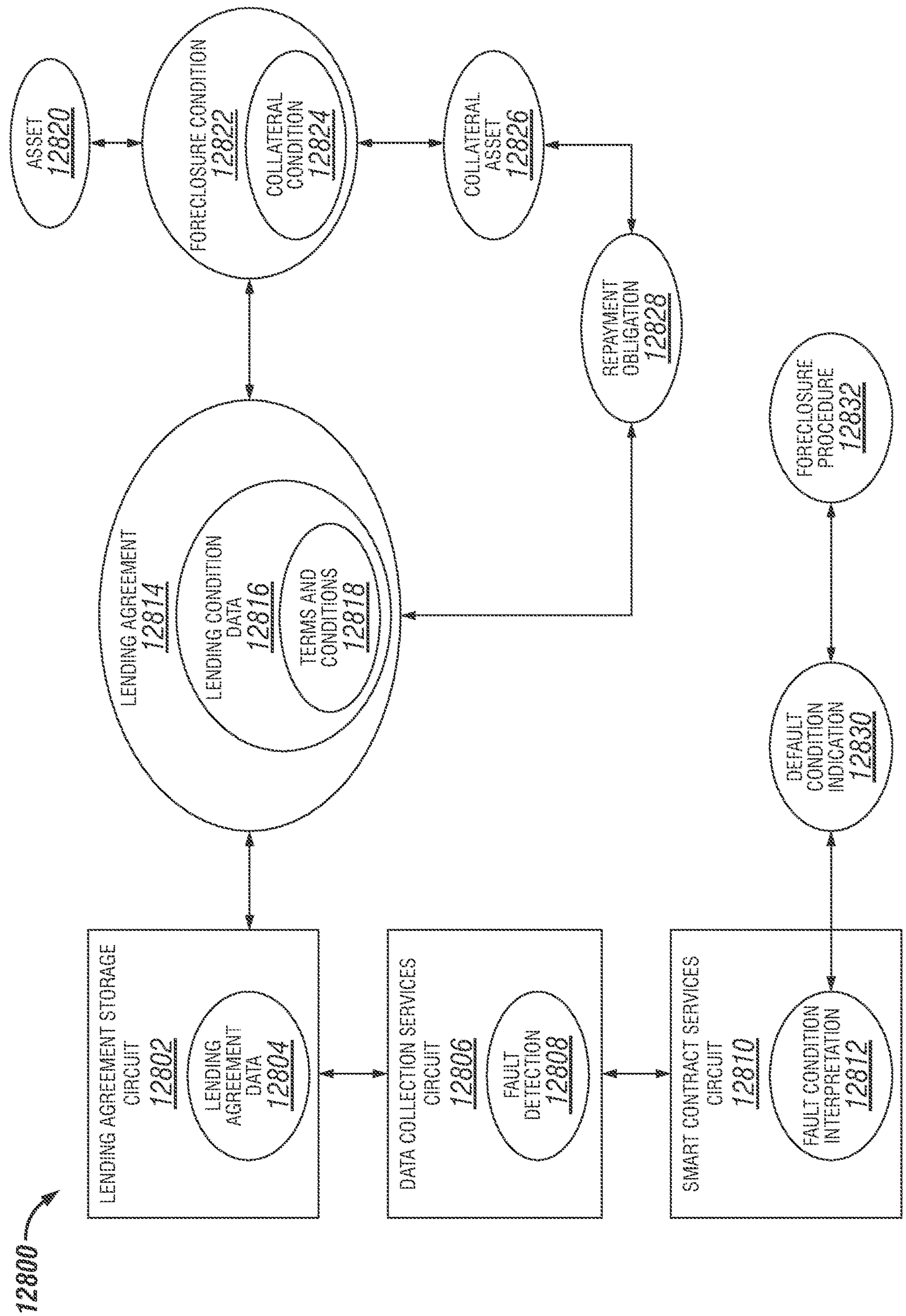
FIG. 128 depicts a system automated handling of loan foreclosure.

FIG. 128 depicts a system 12800 including a lending agreement storage circuit 12802 structured to store a lending agreement data 12804 including a lending agreement 12814, wherein the lending agreement may include a lending condition data 12816. In embodiments, the lending condition data may include a terms and condition data 12818 of the at least one lending agreement related to a foreclosure condition 12822 on an asset 12820 that provides a collateral condition 12824 related to a collateral asset 12826, such as for securing a repayment obligation 12828 of the lending agreement. The system may include a data collection services circuit 12806 structured to monitor the lending condition data and to detect a default condition 12808 based on a change to the lending condition data. Further, the data collection services circuit may include an Internet of Things system, a camera system, a networked monitoring system, an internet monitoring system, a mobile device system, a wearable device system, a user interface system, and an interactive crowdsourcing system. The system may include a smart contract services circuit 12810 structured to, when the default condition is detected by the data collection services circuit, interpret the default condition 12812 and communicate a default condition indication 12830, such as to initiate a foreclosure procedure 12832 based on the collateral condition. For instance, the foreclosure procedure may configure and initiate a listing of the collateral asset on a public auction site, configure and deliver a set of transport instructions for the collateral asset, configure a set of instructions for a drone to transport the collateral asset, configure a set of instructions for a robotic device to transport the collateral asset, initiate a process for automatically substituting a set of substitute collateral, initiate a collateral tracking procedure, initiates a collateral valuation process, initiate a message to a borrower initiating a negotiation regarding the foreclosure, and the like. The default condition indication may be communicated to a smart lock and a smart container to lock the collateral asset. The negotiation may be managed by a robotic process automation system trained on a training set of foreclosure negotiations and may relate to modification of interest rate, payment terms, collateral for the lending agreement, and the like. In embodiments, each of the lending agreement storage circuit, data collection services circuit, and smart contract services circuit may further include a corresponding application programming interface (API) component structured to facilitate communication among the circuits of the system, where the corresponding API components of the circuits may include user interfaces structured to interact with a plurality of users of the system.

Figure 129:
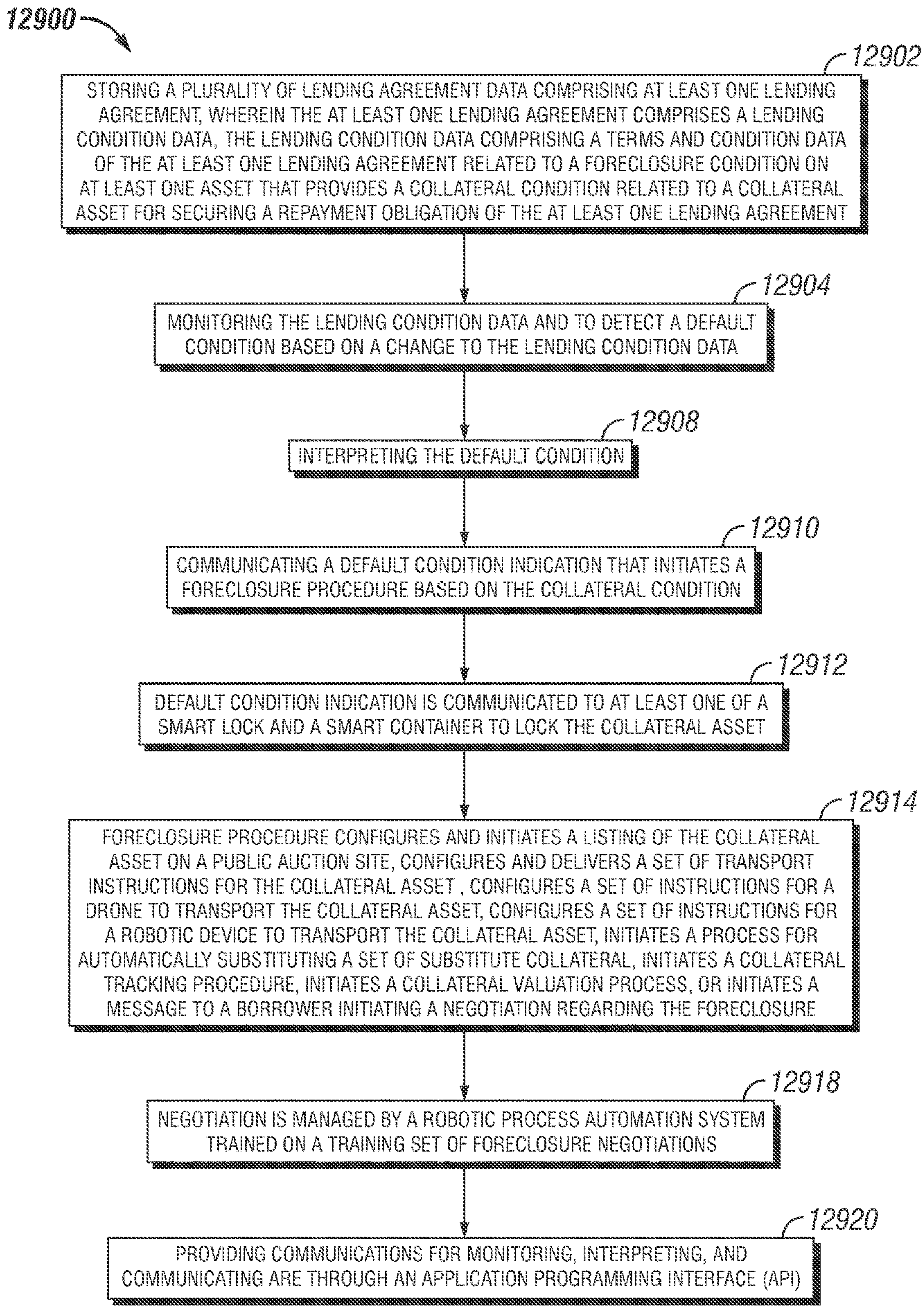
FIG. 129 depicts a method for facilitating foreclosure on collateral.

FIG. 129 depicts a method 12900 for facilitating foreclosure on collateral, the method including storing a lending agreement data including a lending agreement, where the lending agreement may include a lending condition data, such as where the lending condition data includes a terms and condition data of the lending agreement related to a foreclosure condition on an asset that provides a collateral condition related to a collateral asset for securing a repayment obligation of the at least one lending agreement 12902. The method may include monitoring the lending condition data and to detecting a default condition based on a change to the lending condition data 12904. The method may include interpreting the default condition 12908 and communicating a default condition indication that initiates a foreclosure procedure based on the collateral condition 12910. For instance, the foreclosure procedure may configure and initiate a listing of the collateral asset on a public auction site, configure and deliver a set of transport instructions for the collateral asset, configure a set of instructions for a drone to transport the collateral asset, configure a set of instructions for a robotic device to transport the collateral asset, initiate a process for automatically substituting a set of substitute collateral, initiate a collateral tracking procedure, initiate a collateral valuation process, initiate a message to a borrower initiating a negotiation regarding the foreclosure, and the like 12914. The default condition indication may be communicated to a smart lock and a smart container to lock the collateral asset 12912. The negotiation may be managed by a robotic process automation system trained on a training set of foreclosure negotiations 12918 and may relate to modification of interest rate, payment terms, collateral for the lending agreement, and the like. In embodiments, communications may be provided by a corresponding application programming interface (API) 12920, where the corresponding API may include user interfaces structured to interact with a plurality of users.

Market Orchestration System Platforms

Referring to FIG. 201, the present disclosure relates to a market orchestration system platform 20500 that is configured to facilitate electronic marketplace transactions, referred to herein in the alternative as the “platform,” the “system” or the like, with such terms comprising various alternative embodiments involving various sets of components, modules, systems, sub-systems, processes, services, methods, and other elements described herein and in the documents incorporated herein by reference. According to embodiments herein, a marketplace may refer to an environment where assets may be listed and traded by buyers and sellers. Assets may refer to commodities, physical assets, digital assets, services, stocks, bonds, marketplace-traded funds (ETF), mutual funds, currencies, foreign exchange (FX), artwork and other works of authorship, alternative assets, recycled plastics, digital 3D designs, digital gaming assets, virtual goods, real estate, placement rights (such as for advertising), cryptocurrencies, metals and alloys, energy resources, derivatives (such as futures, forwards, options, puts, calls, and swaps), 3D printing capacity, digital twins, storage, intellectual property (e.g., trade secrets, patents, trademarks, designs, know how, privacy rights, publicity rights, and others), instruction sets, hybrid instruments, synthetic instruments, tranches of assets (including similar and mixed-asset tranches), streams of value (such as of interest), certificates of deposit (CDs), and the like, as well as portions of the above (such as divisible and undivided interests), hybrids of the above, and aggregates of the above (including tranches of securities, mutual funds, index funds, and others).

Referring to FIG. 202, the market orchestration system platform 20500 may include an exchange suite 20204, an intelligent services system 20243, a digital twin system 20208, an intelligent agent system 20210, and a quantum computing system 20214.

In embodiments, the platform 20500 includes an API system 20238 that facilitates the transfer of data between a set of external systems and the platform 20500. In some embodiments, the platform 20500 includes marketplace databases 20216 that store data relating to marketplaces, whereby the marketplace data is used by the exchange suite 20204, the intelligent services system 20243, the digital twin system 20208, the intelligent agent system 20210, and the quantum computing system 20214.

As used herein, quantum computing may refer to the use of quantum-mechanical phenomena (such as superposition and entanglement) to perform computation. Quantum computers may refer to computers that perform quantum computations. Quantum computers may be configured to solve certain computational problems, such as integer factorization (which underlies RSA encryption), with a fraction of the computational memory of traditional computers.

In some embodiments, the exchange suite 20204 provides a set of various marketplace tools that may be leveraged by marketplace participants (such as traders and brokers). The marketplace tools may include, but are not limited to, a strategies tool 20240, a trading practice tool 20233, a news tool 20244, a screener tool 20248, a market monitoring tool 20250, an entity profile tool 20252, an account management tool 20254, a charting tool 20258, an order request system 20260, and a smart contract system 20262. In embodiments, the strategies tool 20240 is configured to enable the creation and/or testing of pre-defined trade strategies. In embodiments, the pre-defined trade strategies may be configured for a particular asset type. In embodiments, the trading practice tool 20233 allows users to test and simulate strategies using an account funded with virtual money. In embodiments, the news tool 20244 may be configured to stream live media (e.g., CNBC), news feeds, and/or social media feeds (e.g., Twitter). In embodiments, the live media, news feed, and/or social media feed content may be related to the one or more asset(s) traded in the marketplace. In embodiments, the streamed live media content, news feed content, and/or social media feed content may be selected by an AI system, such as one that is trained based on selections by expert users and/or trained based on outcomes of usage, such as outcomes indicating successful trading activities and other outcomes noted throughout this disclosure. In embodiments, users may define streamed live media content, news feed content, and/or social media feed content to be displayed by the news tool 20244 via a graphical user interface. In embodiments, the screener tool 20248 allows users to filter assets by setting criteria via the graphical user interface. In embodiments, the market monitoring tool 20250 allows users to view marketplace-related data, graphics, heatmapping, watch lists, and the like. In embodiments, the entity profile tool 20252 allows users to view profiles of marketplace entities (e.g., company profiles, asset profiles, broker profiles, trader profiles, and the like) wherein the profiles contain information related to the respective marketplace entities. For example, the entity profile tool 20252 may allow a user to view an asset profile for an asset listed in the marketplace. In embodiments, the account management tool 20254 allows users to manage their accounts and to view account information (e.g., account balances, history, orders, and positions). In embodiments, the charting tool 20258 allows users to build charts related to assets to identify trends. For example, the charting tool may allow users to chart price over time for an asset to identify trends in price movement. The quantum computing interface 20241 enables the interface between the exchange suite 20204 and the quantum computing system 20214.

Referring to FIG. 203, the market orchestration system platform 20500 may include a marketplace configuration system 20302. In embodiments, the marketplace configuration system 20302 interfaces with a configuration device 20304. The configuration device 20304 may consist of any suitable computing device (or set of devices) that executes a client application 20312 that connects to the platform 20500 to provide configuration parameters 20306. Examples of configuration devices 20304 may include, but are not limited to, mobile devices, desktop computers, artificial intelligence-based trading systems, and third-party applications that interface to the marketplace API System 20238.

In embodiments, these third-party applications are thin layers that may consist of a mash-up of different APIs connecting various back end services. For example, the third-party applications may interface to the marketplace API and to a weather API, if weather is deemed relevant to trading a particular asset (e.g., in a market for 3D printed snow skis). In embodiments, these mashup environments connect to various systems without the different back end systems requiring knowledge of the mash-up environments. In some embodiments of the platform 20500, security is centrally managed or outsourced. For example, Google Authentication may be used via OAuth certificates providing for the mash-up to connect to multiple systems and not requiring multiple logins, such that it supports single sign-on.

In embodiments, the market orchestration system platform 20500 may be multi-threaded and provide for seamless real-time monitoring and execution of tasks. In some embodiments, the platform 20500 supports high-performance device implementation using compiled languages, including, but not limited to, SwiftUI™ and Flutter™.

In embodiments, the market orchestration system platform 20500 may be configured to support automated testing. For example, building reliable handling of failures and errors may prevent an application crashing halfway through a trade.

In embodiments, internal device storage of the platform 20500 is based on encrypted data and encrypted use of memory to protect sensitive information, such as personal data, trade secrets and/or sensitive financial information, or the like, from discovery and hacking. In some embodiments, the platform 20500 is configured to enable obfuscation of trading network patterns to prevent third parties from monitoring network traffic to discover major trading events.

In embodiments, the platform 20500 is configured to support different types of traders, including retail traders, institutional traders, individual traders, secondary market traders, brokers, dealers, buyers, sellers, market makers, and others, as well as various other parties and counterparties to marketplace transactions, such as regulators, procurement officers, tax officials and other government personnel, reporters, analysts, bankers, custodial agents, trustees, proxyholders, service providers, ratings agencies, auditors, assessors, accountants, compliance parties, legal service providers, lenders, and many others. References to “traders” or “users” in examples and embodiments throughout this disclosure should be understood to encompass any of these, except where context indicates otherwise. The different types of traders and other parties will likely have different needs around performance specifications for the system, such as relating to latency of execution, latency of data availability, overall availability, quality-of-service, bandwidth, throughput, failover, failure avoidance, error correction, reconciliation, disaster recovery, and the like of the trading system, as well as varying needs for handling of automation capabilities (such as algorithmic execution) and varying needs for trade types and handling of asset classes (e.g., enabling exchange and/or arbitration opportunities between different market environments), and the like.

In embodiments, the platform 20500 is configured to support marketplace participant user devices 20218 in executing a set of atomic transactions in a sequence. In embodiments, these atomic transactions may require dependency (such as selling a first asset before buying a second asset). In some embodiments, the atomic transactions may be independent of sequence (such as selling an asset as fast as possible). In embodiments, orchestration may include generation and/or configuration of policies, rules, business logic, or the like that define sets of allowable transaction patterns by asset type, trade type, trader type, jurisdiction, or the like. In embodiments, these elements (collectively referred to for simplicity as “policies”) may be embodied in code elements that are attached to workloads and/or workflows for transaction execution, such that as transactions types are defined for particular asset classes, trade types, or the like, the policies are embedded into, integrated with, linked to, and/or wrapped around transaction objects, entities, states, and actions, such that each instance of a transaction carries with it the code necessary to recognize and apply policies, including context-sensitive policies, such as ones that are system-dependent, jurisdiction dependent, time-dependent, role-dependent, or the like.

In embodiments, the platform 20500 includes a message response system. The marketplace participant user device 20218 may consistently respond to real-time messages (such as notifications of events relating to market positions, such as trades, price changes, asset-class-related events, and many others). The response mechanism within the marketplace participant user device 20218 may be configured to respond to these messages with automated trading responses and/or with displayed notifications to the user of the device.

In embodiments, platform 20500 includes, integrates with, and/or links to an algorithm-based trading system having the ability to create, test, modify, and/or execute a set of automated algorithms. These automated algorithms may be controlled and managed by the marketplace participant user device 20218 and may be adjusted in real-time in response to changes in events or in response to user controls. In embodiments, the algorithm-based trading system may be constantly running in an extremely secure tier of an execution environment 20202 and may be run with or without the knowledge of the marketplace. In embodiments, the algorithm-based trading system may include algorithm control systems. If an algorithm is hidden in nature, the algorithm control systems may utilize obfuscation behaviors to constrain the ability of the execution environment 20202 to determine that artificial intelligence engines are undertaking trading activities.

In embodiments, the platform 20500 includes marketplace databases 20216. Marketplace databases 20216 may be ACID-compliant, and this ACID compliance may include building the data layer in the ACID-compliant database following ACID-compliant data management practices. ACID-compliant data management practices may include, but are not limited to, handling of duplication or aggregation of data as a part of a transaction or with a known latency against real-time, building a normalized data structure where data is not duplicated, rigorous time-stamping of all data to allow for seamless recovery of past states of the system, and transaction replication, which allows for real-time replication of fine grained data.

In embodiments, data may be configured differently for different types of marketplaces. The database schema abstraction may impact the implementation details for ACID compliance. For example, highly abstract storage may lead to a middle tier ACID implementation layer. In embodiments, the marketplace databases 20216 may include file systems, normalized schemas, denormalized schemas, replicated data, and/or star schemas. In embodiments, the marketplace databases 20216 may enable audit trails. In embodiments, the marketplace databases 20216 may enable blockchain sequencing for accounting resilience.

In some embodiments, the storage levels for the marketplace databases 20216 may include the storage of individual trades and/or the storage of aggregation of the trading information (current state only). In embodiments, historical trading information may be stored as the specific requests to allow for auditing and/or as more processed versions of the trading. For example, if trading is at an extremely high volume, the system may only be able to hold the current state; however, for audit purposes, a log of all historical requests is stored in a linear sequence, providing the ability to reconstruct a position in the market.

In embodiments, the marketplace configuration system 20302 provides an interface (e.g., a graphical user interface (GUI)) by which a user (e.g., a marketplace host) may configure and/or launch a marketplace. While described as a marketplace host, the configuration of the marketplace may be performed by other users, including, but not limited to, brokers and traders (e.g., buyers and/or sellers). In embodiments, the configuration of the marketplace may be performed automatically, as described in greater detail throughout this disclosure.

Referring to FIG. 204, a method is provided for launching a new marketplace according to some embodiments of the present invention. At 20401, a marketplace opportunity identification module 20310 identifies an opportunity to facilitate a new marketplace and/or identifies demand for a new marketplace. In embodiments, the marketplace opportunity identification module 20310 interfaces with third party electronic trading platforms (e.g., buying and selling platforms with shopfront-style trading), social networks, news sources, and the like and applies continuous automated monitoring and/or human-controlled monitoring of these sources for marketplace opportunities. For example, marketplace opportunity identification module 20310 may automatically detect a need for a marketplace for an asset class (e.g., a marketplace for digital twins) from an online source, such as a discussion board. In this example, marketplace opportunity identification module 20310 monitors demand and/or other factors indicating potential economic opportunity through the application of models, analytics, or the like, such as linear regression, and/or the application of artificial intelligence systems, such as neural networks or other AI systems described throughout this disclosure and the documents incorporated by reference herein. Continuing the present example, if the marketplace opportunity identification module 20310 finds that there is substantial demand for a marketplace for digital twins (such as a marketplace of digital twins of particular items), the marketplace opportunity identification module 20310 may make a decision to build a new marketplace to address such demand, enabling traders to buy and sell the digital twins. In examples, the marketplace opportunity identification module 20310 may make a decision to build a new marketplace for refurbished exercise equipment upon finding a substantial demand for such equipment via monitoring social networks. Continuing the example further, the refurbished exercise equipment may be delivered to the buyer, or the exercise equipment may be traded without the equipment being delivered to the buyer, thus creating liquidity in the market. In examples, marketplace opportunity identification module 20310 may automatically detect a need for airplane kit certification services from a trading platform chat discussion. Alternatively, a user (e.g., marketplace host) may identify a market opportunity and request to launch a new marketplace for one or more assets via the graphical user interface.

At 20402, the marketplace configuration system 20302 receives marketplace opportunity data (asset(s), asset type(s), asset data, asset demand data (demand quantities, demand locations, demand demographics, demand indicators), and the like) from the marketplace opportunity identification module 20310. In some embodiments, a user may define the assets and/or type(s) of assets that may be listed in the marketplace. In embodiments, the user may select different assets and/or asset types that will be supported for the marketplace by the platform 20500 via a GUI presented by the marketplace configuration system 20302. For example, the user may select different assets from a menu of assets and/or select different types of assets from a menu of asset types.

At 20403, the marketplace configuration system 20302 determines, optionally automatically, marketplace configuration parameters 20306 based on the received market opportunity data. In embodiments, the marketplace configuration system 20302 optionally leverages machine learning and/or artificial intelligence to automatically select marketplace configuration parameters 20306, such as to optimize the marketplace for efficiency, risk management, profitability, and/or other measures. In some embodiments, a user may enter marketplace configuration parameters via the graphical user interface. The marketplace configuration parameters 20306 may include, but are not limited to, assets, asset types, description of assets, method for verification of ownership, method for delivery of traded goods, estimated size of marketplace, methods for advertising the marketplace, methods for controlling the marketplace, regulatory constraints, data sources, insider trading detection techniques, liquidity requirements, access requirements (such as whether to implement dealer-to-dealer trading, dealer-to-customer trading, or customer-to-customer trading), anonymity (such as determining whether counterparty identities are disclosed), continuity of order handling (e.g., continuous or periodic order handling), interaction (e.g., bilateral or multilateral), price discovery, pricing drivers (e.g., order-driven pricing or quote-driven pricing), price formation (e.g., centralized price formation or fragmented price formation), custodial requirements, types of orders allowed (such as limit orders, stop orders, market orders, and off-market orders), supported market types (such as dealer markets, auction markets, absolute auction markets, minimum bid auction markets, reverse auction markets, sealed bid auction markets, Dutch auction markets, multi-step auction markets (e.g., two-step, three-step, n-step, etc.), forward markets, futures markets, secondary markets, derivatives markets, contingent markets, markets for aggregates (e.g., mutual funds), and the like), trading rules (e.g., tick size, trading halts, open/close hours, escrow requirements, liquidity requirements, geographic rules, jurisdictional rules, rules on publicity, insider trading prohibitions, conflict of interest rules, timing rules (e.g., involving spot-market trading, futures trading and the like) and many others), asset listing requirements (e.g., financial reporting requirements, auditing requirements, minimum capital requirements), deposit minimums, trading minimums, verification rules, commission rules, fee rules, marketplace lifetime rules (e.g., short-term marketplace with timing constraints vs. long-term marketplace), and transparency (e.g., the amount and extent of information disseminated). In some embodiments, marketplace configuration parameters 20306 may include allowing failed trades with no recourse.

In some embodiments, each type of asset has a predefined set of default configuration parameters. In some embodiments, the set of configuration parameters for each type of asset may be customized (e.g., by the marketplace host). In these embodiments, a user may define the marketplace configuration parameters that govern the marketplace for a type of asset.

In embodiments, a user, such as a buyer, seller, broker, agent, or the like, may define marketplace configuration parameters under which the user is willing to engage in trading activity and the marketplace opportunity identification module 20310 may use the defined parameters to identify opportunities to establish configurations that will encourage active trading among an aggregate set of parties that share configuration preferences. For example, a buyer may indicate a preference to trade in day-ahead futures of a defined type of token and be matched with sellers who hold such tokens are similarly interested in day-ahead trading.

At 20404, the marketplace configuration system 20302 makes or enables one or more decisions related to the setup and nature of the marketplace to be built. In this step, the marketplace configuration system 20302 may evaluate the received marketplace opportunity data and/or marketplace configuration parameters 20306 and prioritize the implementation of the marketplace based on a set of desired outcomes (such as overall profitability of the marketplace, efficiency of the marketplace, generation of threshold levels of overall participation and/or participation by parties of desired types, generation of threshold levels of trading activity, and the like). Configuration may be based on a model or plan of marketplace development, such as one that indicates and manages phases of marketplace development, such as market initiation (e.g., involving allocations of tokens, credits, trading rights, or the like according to desired rules or business logic), early stage marketplace development (such as involving offering incentives, subsidies, promotions or the like to facilitate development of trading activity to threshold levels), healthy marketplace operation (such as adjusting, optionally automatically, parameters of operation of the marketplace (such as smart contract terms, APIs, trading rules, or the like) upon receipt of indicators that the marketplace has reached threshold levels of trading and participation by desired numbers and types of counterparties and supporting users), and unhealthy operation (such as where one or more desired characteristics of market operation are outside desired ranges or thresholds, e.g., where trading is too thin, where gaming behavior is evident, where undue market power is evident (e.g., the market is cornered), where front-running is observed, or the like). In embodiments, artificial intelligence systems may be trained to recognize or understand the stage of a marketplace and to automatically adjust parameters of configurations of the marketplace based at least in part on the understood stage, including any of the configuration or other marketplace parameters noted throughout this disclosure. The artificial intelligence system may be trained by deep learning on outcomes, by use of a training set of data involving expert configuration by human operators, by combinations of the above, or by other techniques described herein or in the documents incorporated by reference, or other training techniques known to those of skill in the art.

In embodiments, the marketplace configuration system 20302 evaluates and experiments with new marketplaces, which may involve setting up test environments to determine if the marketplace is technologically or economically feasible and/or evaluating the marketplace with a test set of traders, with a test set of trading rules, with a test set of assets, with a test set of initiation parameters (such as incentives or promotions) or the like. In embodiments, digital twins may be generated by the digital twin system 20208 to perform simulations so that the viability of the suggested marketplace may be evaluated. Digital twins may include twins of goods (physical and digital) and other assets, twins of users, twins of environments and facilities, and other items. For example, a digital twin may track and represent conditions of physical items the ownership rights to which are to be traded in a marketplace, reflect impacts of environmental conditions (e.g., weather, climate, or other physical processes, and many others) on items, and the like, thereby allowing testers to observe impacts of physical changes in the marketplace (e.g., to test or simulate impacts of depreciation or degradation). Twins can similarly simulate marketplace activity, such as trading levels and patterns, price changes, and many others. In embodiments, the marketplace configuration system 20302 may determine that certain marketplace configuration parameters 20306 are unfavorable, and as a result, the marketplace configuration system 20302 may update the configuration parameters 20306 to improve and/or optimize the performance of the marketplace.

At 20405, the marketplace configuration system 20302 determines data sources to support the marketplace, including optionally configuring one or more databases. Configuration of a core database architecture may, in embodiments, facilitate various performance capabilities of the marketplace. Database types that may be implemented may include relational databases, SQL and NoSQL databases, highly real-time databases, graph databases, distributed databases, elastic databases, object-oriented databases, and the like, including various combinations of the above.

At 20406, the marketplace configuration system 20302 determines the architecture of the marketplace, which may include determining the tools and/or libraries used to support the marketplace. Decisions at this step may involve careful planning of the algorithms that may be used by the marketplace and around the key requirements for the system. Key architecture considerations may include logging requirements, audit requirements, acceptable latency, failover requirements, disaster recovery requirements, acceptable input/output volumes per period of time, volume of trades, requirements for complex transactions, and resolution of trades that take longer time periods.

At 20407, the marketplace configuration system 20302 determines the design of the data within the selected database environment using data modeling and data flow design tools. The data modeling processes may leverage data modeling tools and/or intelligent agents 20234 to lay out new schemas from scratch or to use existing template schemas. In embodiments, these processes may be fully automated using sophisticated automatic schema design tooling. Data modeling tools that may be implemented include, but are not limited to, ERWIN™, Visio™, and WhereScape RED™. Building on the architecture for the underlying database schema may be an iterative process involving block 20406 and block 20407 to determine the overall system architecture.

At 20408, marketplace configuration system 20302 configures a marketplace object 20308 in accordance with the determined architecture, configuration parameters 20306, and the like. The establishment of a new marketplace in this step may be either an entirely new kind of marketplace or an implementation of an existing marketplace with adjusted parameters. The marketplace configuration system 20302 reads the input parameters and loads them into its system. Key tasks in this step may include filling in default values, determining monitoring parameters (to determine when market is operating outside of its designed nature), management of failure and exceptions, and handling of hacking and security.

At 20409, the marketplace configuration system 20302 connects databases to the marketplace object 20308. In embodiments, the underlying database business rules are version-controlled and overlaid with version-controlled marketplace object 20308 that provides for the execution of trades. In embodiments, the marketplace object 20308 holds a set of metadata that defines the overall market operational parameters, the state held within this object can be held in version software (such as GIT or a version-controlled database). This version-controlled marketplace object 20308 may be used by the execution environment 20202 to operate the marketplace. In embodiments, the underlying database is designed to hold information regarding assets, transactions, and market positions held by buyers and sellers, as well as optionally holding various additional data and/or metadata about the above and other elements relevant to the marketplace, such as external factors that may impact buyers, sellers, assets, trading, or the like. In embodiments, connection information may include information about markets for derivative markets. For example, a marketplace for food delivery may include traders in derivative cash-settled marketplaces where the traders are betting on the future value of commodities in a monitored hot food delivery marketplace. Once the marketplace object 20308 is connected to the underlying database, the logic of the operating market may be tied directly to the data that is generated, which places a requirement that future releases of the marketplace object 20308 need to be able to seamlessly upgrade without breaking historic data collection rules. Future upgrades of the marketplace object 20308 may include upgrade logic that may include procedures that update the underlying database to make it compliant with the requirements of the future database.

In some embodiments, a user (e.g., a marketplace host) may connect one or more data sources 20224 to the market orchestration system platform 20500. Examples of data sources 20224 that may be connected to the platform 20500 may include, but are not limited to, the sensor system 20274 (e.g., a set of IIoT sensors), news sources 20278, the market data 20280 (such as level 1 and level 2 market data), the fundamental data 20282, reference data 20284, historical data 20288, third party data sources 20290 that store third party data, edge devices 20292, regulatory data 20294 (e.g., SEC filings), social network data 20298, and message board data 20201. Level 1 market data may refer to the real-time best bid-offer-volume data for a given asset while level 2 market data may refer to the real-time quotes for each market maker (e.g., individual market participant or member firm of a marketplace). Fundamental data may refer to data relating to a marketplace asset's underlying value and potential for future growth (e.g., revenue, earnings, and cash flow for a yield-producing asset, appraised or assessed value, or the like). Reference data may refer to marketplace entity identifiers used to complete and settle financial transactions. The data sources 20224 may include additional or alternative data sources without departing from the scope of the disclosure. Once the user has defined the configuration of a marketplace, wherein the configuration includes the selected asset types and trading rules, the user may then define the data sources 20224 that are connected to the platform 20500. In some embodiments, data from one or more of the data sources may be fused and/or analyzed before being fed into the platform 20500.

At 20410, the marketplace configuration system 20302 launches the marketplace. In embodiments, the marketplace configuration system 20302 may leverage cluster management tools (such as Trinity X™) to change the run-time parameters and operational nature of instances, allowing for the continuous operation in the face of workload demands. In embodiments, the marketplace configuration system 20302 may leverage high performance computing (HPC) clustering. In embodiments, clusters may be dynamically changeable based on the requirements of specific marketplaces or system workloads. In embodiments, the marketplace configuration system 20302 may allow for some marketplaces to be shut down in response to workloads (including excessive or inadequate demand) or in response to other factors, such as improper trading patterns (e.g., triggering of a market crash or bubble by unconstrained algorithmic trading systems), exogenous events (e.g., changes in other markets, natural disasters, civil unrest, or the like), etc. In some embodiments, the marketplace configuration system 20302 may allow for service-level agreements (SLAs) to be changed in response to demand and other factors. In embodiments, the marketplace configuration system 20302 may limit users on the system or change entry requirements for traders in an environment.

In embodiments, the marketplace configuration system 20302 enables a user (e.g., a marketplace host) to define the users that may access and/or may not access the marketplace. For example, the user may define a blacklist of users that may not access the marketplace and/or define a whitelist of users that may access the marketplace. As examples, a whitelist may include members of a trade organization, a set of members of an industry consortium, a set of members of a treaty, members of a corporate group, members of a list of permitted parties (e.g., parties on a government contracting schedule or the like), a set of parties to an agreement, or others. In embodiments, the marketplace configuration system 20302 enables a marketplace host to invite other users to trade in the marketplace. In embodiments, the platform 20500 may be configured to enable the creation of trader accounts for buyers and sellers. In embodiments, the platform 20500 may be configured to automatically generate a trader profile associated with each created account.

In embodiments, the platform 20500 may include serverless environments. In these serverless environments, the application software may run directly on "bare metal" computational infrastructure or in computational systems optimized for execution. The serverless environments may include a set of cloud environments where the cloud provider is completely responsible for service level, such as latency of response, overall memory availability, backup, disaster recovery, load balancing, and the like. In embodiments, the cloud environments may employ elastic load balancing, including application load balancing, network load balancing (including path-sensitive or route-sensitive load balancing), and the like.

In embodiments, the platform 20500 may allow users to add assets such that the assets are listed in the marketplace. In embodiments, the platform 20500 may allow users to remove assets from the marketplace such that the assets are no longer listed in the marketplace. In embodiments, the platform 20500 may be configured to automatically generate a profile associated with each asset. In embodiments, adding an asset may include digitizing an asset. Digitizing an asset may be performed by capture in digital media (such as scanning, photography, video, audio recording, or the like), by generation of digital content (such as entering descriptive information into an interface), or the like. Digitizing may include populating a digital object for the asset that corresponds to the class of the asset, where the object reflects parameters and attributes of the asset class and/or a data schema that is appropriate for the asset and for the marketplace. Attributes may include digital representations of analog data (such as transformed, compressed, or similar data), physical data, logical data, outputs of natural language processing, metadata elements, and the like. Digitizing may include automated extraction, transformation and loading of data, including steps of normalization, deduplication, clustering, scaling, cleansing, filtering, linking (such as linking to one or more identities), and the like. Digitizing may be performed by artificial intelligence, such as by robotic process automation, where the artificial intelligence system is trained to digitize an asset according to a data schema, object class, or the like based on a training set of data wherein one or more experts has digitized assets of the same or similar type. In embodiments, adding an asset may include uploading metadata related to the asset. In embodiments, adding an asset may include uploading one or more photos, videos, virtual reality experiences, documentation, digital twins, and the like.

In embodiments, a user may create an order request for an offer to buy or sell one or more assets. In embodiments, a user may select an option to create a new order request. In some of these embodiments, the user may be presented a GUI to provide one or more parameter values. For instance, the GUI may include fields for the user to identify one or more assets and define a requested action (e.g., buy or sell), quantity of asset(s), order type (e.g., limit order), price, time-in-force, special instructions, advanced order entry, and the like. In embodiments, the platform 20500 may be configured to enable the cancellation of orders. In some of these embodiments, the order cancellation may be triggered upon the detection of an event, such as by one or more monitoring and/or detection systems described herein or in the documents incorporated herein by reference. Events that result in cancellation may include price shifts in the marketplace or another marketplace, changes in eligibility or other statuses of a party, changes in state of an asset, changes in regulatory or policy factors, cancellation actions by a party, and others.

In some implementations, the platform 20500 may include an execution engine 20228. In embodiments, the execution engine 20228 may be configured to receive an order request from a party to execute a transaction for one or more assets listed in a marketplace. In embodiments, the execution engine 20228 may be configured to selectively execute a transaction based on the order request. For example, the execution engine 20228 may receive an order request, which may include, but is not limited to, requested action (e.g., buy or sell), quantity, asset(s) (e.g., stock symbol), order type (e.g., limit order), price, and time-in-force. The execution engine 20228 may, upon determining that the requested order is permissible (e.g., the assets are not illegal and there is no detected fraudulent activity), feed this information into an intelligent matching system 20230 that matches the order to one or more other orders (e.g., matching a buy order with a corresponding sell order for the same asset type where the respective prices are compatible). In embodiments, the execution engine 20228 may receive matched orders from intelligent matching system 20230 and execute the matched orders. In embodiments, the execution engine 20228 may generate a trade confirmation and send the trade confirmation to the one or more traders associated with an executed transaction.

Smart contracts are executable computer programs that operate upon relevant inputs from data sources and apply logic that embodies a set of applicable contract terms and conditions to produce outputs. In embodiments, smart contracts may be compiled into a data block in a distributed ledger or other data repository and may be configured to be deployed on computational infrastructure with appropriate provisioning of computational resources, definition of interfaces (e.g., APIs), and security framework (e.g., setting permissions for identities, roles, and the like). Once deployed to a distributed ledger or other secure computational platform, the smart contract may be accessed by data connection by various computational systems, such as to accept inputs and to provide outputs. In embodiments, a smart contract is deployed on a ledger that provides cryptographic security, such as involving a blockchain, such that the smart contract may be executed with confidence that it has not been modified by a malicious actor. While referred to as "smart contracts" because they may represent and implement agreements between various parties, such as regarding the transfer of cryptocurrency, the purchase and sale of goods, and transactions involving other types of assets, a smart contract does not strictly have to represent an explicit contractual arrangement; for example, a smart contract may implement business logic upon inputs to provide outputs within a workflow or business process.

In embodiments, a smart contract may be written in program code using a scripting language such as JavaScript, Solidity, Python, or other scripting languages, or an object coding language, such as Java, or a machine coding language such as C or C++. When a smart contract is deployed, such as into a distributed ledger or other computational systems, the program code may be processed into a block by a participant and written to the distributed ledger or other computational systems in the same manner any other data block is written to the distributed ledger or system (for example, in exchange for a fee paid to the node participant who compiles the contract/program). In embodiments, the process of deploying the smart contract may include compiling the program code into bytecode, object code, binary code, or some other executable form. When the smart contract is successfully deployed, the smart contract/data block containing the smart contract may be assigned an address, which may subsequently be used to access the smart contract and execute the functionality provided therein. In embodiments, a smart contract may include a connection to or provision of an Application Programming Interface (API), a connection to or provision of an Application Binary Interface (ABI), which is analogous to an API, or other interfaces (such as a bridge, gateway, connector, portal, or other data integration interface), such that the smart contract may interface with external software modules and systems. In this way, the smart contract may interact with various software modules (e.g., a wallet application and/or other smart contracts), data sources (such as data feeds, event streams, logs, search engines, and many others), and/or a user of the smart contract. In embodiments, a smart contract may have API, ABI, or other connection interface information associated therewith that defines a manner by which a user leverages the interface so that the user can interact with the various functions of the smart contract. In embodiments, the connection interface information describes the various functions and methods provided as part of the smart contract so that they can be accessed by the user or the user's software.

Once a smart contract has been deployed, the smart contract may then be used by access to the address of the smart contract according to defined permissions, which may include open access and/or private access. In embodiments, executing the contract, or a portion of it, does not necessarily incur fees unless required as part of a step in the contract (such as fees required to update a distributed ledger upon which the contract is deployed). In embodiments, many different users may utilize the contract/program simultaneously to govern their own specific agreements or transactions.

In some embodiments, the smart contract may be invoked by conditional logic (e.g., as defined in the program code of the smart contract, of another smart contract, or being executed by a software system). For example, a smart contract may be invoked upon the occurrence of external or internal events. An external event may be an event that occurs independent of the smart contract and the parties associated therewith, while an internal event is an event that occurs with respect to the smart contract and/or the parties associated therewith. In embodiments, a smart contract includes conditional logic that responds to a set of triggers and executes a set of steps (e.g., a set of smart contract actions) that are performed by the smart contract in furtherance of the smart contract. These actions may include recording documentation of events, transferring funds or assets, filing documents with governmental, regulatory, or corporate entities, initiating a workflow (e.g., maintenance workflows, refund workflows, purchasing workflows, and/or the like), and/or other suitable actions. In embodiments, a smart contract may be configured to receive data that is indicative of events, for example, via an API, ABI, or other connection interfaces of the smart contract. In embodiments, the smart contract may include a listening thread that listens for specific types of data. In embodiments, the smart contract may employ an active thread, such as a search or query of applicable logs or other data sources, to search for relevant events or triggers. When the data is received and/or retrieved, the smart contract may process the data and operate on the data using the conditional logic defined in the smart contract. For example, in response to the conditional logic detecting the occurrence of an event or other trigger, the smart contract may execute the smart contract action defined therein. In embodiments, the parties may agree to a manner by which triggers are verified, such as which data sources may be leveraged to verify events.

In embodiments, a smart contract 20232 may refer to software (e.g., a set of computer-executable instructions) executed by one or more computing devices that performs one or more predefined actions upon verification of one or more triggering conditions/events, where the actions and triggering conditions/events embody the terms and conditions of an agreement among counterparties that is reflected in the structure of the smart contract. For example, a smart contract may be configured to monitor the price of a barrel of oil and to transfer the contract rights to a set quantity of oil from a seller to a buyer when the price of a barrel of oil falls below a threshold, such that the transfer of contract rights from the seller to the buyer is the predefined action of the smart contract and the price of a barrel of oil falling below the threshold is the predefined condition. In embodiments, smart contracts may be stored on a distributed ledger 20222 (e.g., a blockchain) and may be executed by the nodes that store the distributed ledger 20222. Additionally or alternatively, the platform 20500 may execute smart contracts generated by or associated with the platform 20500. In some embodiments, the platform 20500 and/or one or more of ledger nodes that host the smart contract may provide an execution environment on which the smart contract 20232 is executed. In embodiments, the smart contract may be defined in accordance with one or more computing protocols (e.g., the Ethereum protocol). In some embodiments, the smart contract 20232 may be contained and/or executed in a virtual machine or a container (e.g., a Docker container).

In embodiments, a smart contract may operate on a set of data storage and computational resources, which may be optionally shared with other services, components, systems, modules, sub-systems and/or applications of the platform 20500, such as where the smart contract system includes or is composed of a set of microservices that are part of a set of microservices in the architecture for the platform 20500. Storage, computation, and workflow execution may be performed, for example, on a set of blockchains, such as on a set of blockchain-based distributed ledgers; on a set of application programming interfaces, such as APIs for input connections to a smart contract and output connections from the smart contract to various other systems, services, components, modules, sub-systems, applications, or the like; on a set of dedicated hardware devices (including hardware wallets, hardware storage devices of various formats (hard disks, tape, cloud-based hardware, data center hardware, servers, and many others); in a set of wallets; in a set of accounting systems; in a container; in set of virtual machines; embedded within an API to a marketplace; on a public cloud; on a public/private cloud (such as where elements are subject to varying permissions/authorization); on an intelligent switching device (such as an edge computational device or a network device that is provisioned/assigned to an exchange or marketplace); on and/or integrated with a physical asset to which the smart contract relates, such as in the premises of the asset in a local area network and/or physically located on the asset (such as on an asset tag or integrated into a native storage system of an information technology system of the asset, such as an on-board diagnostic system of a machine or random access memory of a consumer device); integrated into a digital twin of an asset to which the smart contract relates (such as any of the types of twin described herein); in a software system (such as an ERP system, a CRM system, an accounting system or the like); embedded in a collaboration system (such as a shared document environment (e.g., a Dropbox™, Google™ doc, sheet or slide presentation, or the like)); embedded in a communication system storage element (such as a video-conferencing system storage element); embedded in storage for a marketplace execution engine (such as a payments engine, a fulfillment engine, or the like); and/or combinations of the foregoing, and various others.

In embodiments, a smart contract 20232 may include executable logic, data, and/or information related to facilitating a marketplace transaction, including one or more triggers and one or more smart contract actions to be executed in response to indication or verification of one or more of the triggering conditions or events. In embodiments, the triggers (e.g., triggering events or conditions) may define conditions that may be satisfied by performance of activities by one or more parties (such as the sellers, buyers, agents, third parties, etc.) and/or occurrences of events outside the performance of parties (e.g., a value of an asset or set of assets exceeds or falls below a threshold, the occurrence of a natural disaster within a geographic region, the allowance of a particular intellectual property right by a particular jurisdiction, the degradation of the condition of an asset, the depreciation of the value of an asset, a regulatory change, or the like). Examples of the triggering events or conditions include payment of a defined amount of currency by one party (e.g., the buyer), verification that a party to a marketplace transaction is within a defined geographic area (e.g., a country, city, state, or the like), verification that an asset has been certified by a third-party, verification of an occurrence of a predefined market condition, or the like. Examples of smart contract actions may include initiating a transfer of an asset from a seller to a buyer, recording a transfer of ownership of an asset from the seller to the buyer on a distributed ledger, adjusting one or more terms (e.g., price, interest rates, allocation of responsibility or other suitable terms) in response to determining that a party to the transaction is located within or outside of a predefined area, or the like.

In some embodiments, the smart contracts may be generated by expert users (e.g., smart contract developers) that are associated with customers or the platform 20500. Additionally or alternatively, the platform 20500 may provide a graphical user interface that allows a user to parameterize a smart contract based on a smart contract template. In some of these embodiments, the platform 20500 may include a set of predefined smart contract templates that are used for different types of transactions and/or different types of assets. Each smart contract template may include predefined code that may include parametrizable instructions, such that a user may provide one or more values to parametrize the parameterizable instructions. In these embodiments, a smart contract developer may define the smart contract templates, whereby the smart contract templates include parameterizable fields.

Additionally or alternatively, the platform 20500 may provide a robotic process automation or other artificial intelligence systems that may generate a smart contract and/or a smart contract template, and/or may parameterize a smart contract that is characterized by a template, based on a model, a rule set, and/or a training set of data created by one or more expert users, or combinations thereof. For example, a model may be provided to an artificial intelligence system for generating a smart contract that embodies an option transaction, where the artificial intelligence system is trained to generate the smart option contract based on a training set of data whereby expert users generate option contracts for options to purchase an asset class, including training data that indicates selection by the expert users of the duration of the options, the pricing of the option itself, and the pricing of the asset upon triggering of the option.

In some embodiments, the smart contract template may be associated with a type of marketplace, such that the template may be used to generate smart contracts suitable for the types of assets and the types of transactions that occur within the particular marketplace. In some cases, this may include a smart contract template for each transaction type for the marketplace, for each asset type and/or for each combination of asset and transaction type. For example, a template may relate to a smart contract for a purchase and sale contract for defined quantities of a commodity in a commodities exchange, or it may relate to a firm price offer for a defined product, deliverable or service in an outsourcing marketplace or a reverse auction marketplace. In some embodiments, the set of smart contract templates that may be parameterized for a particular marketplace may be limited by the type of the marketplace. For instance, in supporting generation of smart contracts for trading financial instruments, the set of parameterizable smart contract templates may be limited to smart contracts that govern the selling, buying, trading, and/or optioning financial instruments. Similarly, in supporting generation of smart contracts governing the trading of real property rights, the set of parameterizable smart contracts may be limited to smart contract templates that govern the selling, leasing, buying, trading, or otherwise transacting with respect to real estate. In this example, smart contract templates governing real estate transactions may be parameterized with an address of the real estate, a price associated with the transaction, requirements (e.g., cash only, proof of financing, citizenship/legal status in the jurisdiction of the real estate, or the like), parties associated with the transaction (e.g., property owner, seller agent, and/or the like), legal terms and conditions (e.g., liens, encumbrances, rights of way, property boundaries, and the like), or other suitable parameters.

In example implementations of a warranty smart contract configured to manage a warranty for a product, the warranty smart contract may be configured to be invoked in response to the purchase of a product. In this example, a customer registering the product on the seller and/or producer's website, the product (e.g., a smart product) being turned on and connecting to a network, the sale of the product itself (e.g., via a marketplace), and/or other suitable events may trigger the invocation of the smart contract. In response, the smart contract may execute at one or more nodes of the distributed ledger and may listen for or actively retrieve specific data. For example, if the product is a smart product, the product may report usage data (e.g., such as each time the product is used, each time the product is turned on, and the like), error data (e.g., each time the product encounters an error condition), misuse data (e.g., when an accelerometer or other motion data collected by the device indicates the product was misused), or other suitable data. Upon detection of a trigger, the smart contract may automatically calculate an applicable warranty period, such as ninety days from product activation, thirty days from purchase, or the like. In embodiments, a smart contract may be configured to initiate issuance of a refund or replacement product in response to determining that the product is in an error state that cannot be resolved. In examples, the warranty smart contract may be configured to void the warranty if the smart contract receives misuse data that indicates that the product is damaged as a result of misuse of the product.

As described elsewhere herein, smart transactions may include automated smart contract negotiation/review, such as for establishing, among other things, contract enforceability. Automated smart contract negotiation/review may include configuring logic and/or artificial-based intelligence for ensuring that contract terms are at least enforceable and that terms in the contract can be enforced. As a smart contract is being constructed/negotiated and/or as part of contract review, computing logic, interfaces (computer-based and real world), and validation functions could be instantiated and performed based on terms of the contract, preferences of the participants, agreements of the participants, market factors, risk, existing contracts, and the like. A smart contract could consider events that trigger a condition of a contract and ensure that they can be detected and validated, optionally on an ongoing basis during the life of the contract. A smart contract generation process could consider the conditions on which a contact is based (e.g., terms) and ensure that they are detectable. A smart contract could consider contract actions required and ensure/validate that they can be successfully taken. A smart contract could be configured to be aware of the "type" of contract, such as a domain in which the contract is operative and adapt itself (e.g., ensuring terms are compliant within a regulated industry). A smart contract could consider risk when instantiating/validating interfaces. This may be beneficial to contract stability and may ensure that a high-risk contract participant might require more onerous initial (and possibly ongoing) validation (and consequently stricter terms) as compared to a low-risk participant. Further, a smart contract could use risk to determine/adjust aspects of a contract (or actions based on terms in the contract), such as frequency of checking an account balance or the like.

In embodiments, a smart contract might be interactive with a negotiating participant. It may present impact scenarios for a proposed contract term to a participant and offer alternatives, such as suggesting conditional escrow in lieu of direct payments, etc.

A basic smart contract negotiation/review/enforceability example of ensuring enforceability for a royalty term (e.g., pay X to A when Y is sold by B) might involve several actions that may be performed in one or more sequences, such as the following exemplary sequence: (i) identifying a payment account for A into which the royalty is to be paid and ensuring that a deposit into that account can be verified; (ii) verifying an interface to a sales/AR system of that tracks when Y is sold; (iii) verifying that a sale of Y by B can be detected; (iv) detecting an interface to a financial account of B that is credited when Y is sold, etc. Ensuring enforcement might include further establishing conditional rights (and the real-world mechanisms) to perform a financial transaction from the sales account of B to the royalty payment account of A. A smart contract could instead enforce sales proceeds of a sale of Y to pass through an interim account where the royalty could be withdrawn (under proper contract terms) so that the royalty recipient A is not dependent on the Y seller B to voluntarily make the royalty payment.

In examples of a smart contract implementation, a smart contract may be configured to facilitate distribution of a settlor's estate upon the settlor's death. Such an estate smart contract may take into account participants of an estate including inheritors of the estate, such as descendants of the settlor, entities defined in the estate or related contracts (e.g., a settlor's will and the like), administrators of the estate, such as a Trustee, Independent Trustees, personal representatives, and the like. Participants may be individually identified and/or defined, through use of terms such as "descendant." Estate administrators may be defined individually (e.g., a person and/or an entity such as a law firm and the like). Additionally, estate administrators may further be defined through estate rules for establishing and maintaining such administrators.

Relationships for the purpose of administration and/or distribution of an estate between and among the participants may be called out in or in association with an estate smart contract. An example of how an estate smart contract may be configured to address relationships among participants may include automatic generation, delivery, and verification of attestation agreements for each participant. An estate smart contract may rely on the terms of an estate that require, for example, that an Independent Trustee be unaffiliated with other participants and under no obligation of and receive no benefit from the estate to generate an electronic attestation document and work cooperatively with a digital signature system (e.g., such as a system by which real estate transactions and other contracts are executed) for verification thereof.

An estate smart contract may be configured to determine asset control terms by which assets of the estate are to be administered and/or distributed. The asset control terms of or for an estate smart contract may cover different phases of an estate (e.g., a first estate phase while the settlor is alive, a second estate phase after the settlor's death, a third phase based on an age of an inheritor, and the like) and therefore may provide for different control of estate assets based on the current phase of the estate. As an example of estate smart contract asset control, during a lifetime of a settlor, a financial account may be placed under the settlor's control. Upon verification of the settlor's death, which may be automated in a range of ways, control of the financial account may automatically be changed to the designated Trustee of the settlor's estate. This may involve verification of the settlor's death certificate (automated or otherwise) and presentation thereof to an account control designation function of the financial account along with the necessary authorization by the Trustee to be designated as the owner of the financial account. An estate smart contract may be configured with functions and/or interfaces through which necessary information, such as electronic delivery of a verified death certificate, and/or legally identifying information for the trustee may be accessed and used for financial control change purposes.

Assets of the estate that may be administered and/or distributed through use of an estate smart contract may include physical assets (e.g., objects, real estate, and the like), financial assets (e.g., bank accounts, investment accounts, retirement accounts, individual financial instruments, cash, and the like), and financial obligations (e.g., debts, business obligations of the settlor, estate taxes, estate administrative fees, legal fees, and the like). An estate smart contract may facilitate distribution of a family heirloom (e.g., an autographed baseball) to an inheritor (that may be defined in a linked smart will contract) by automatically notifying the inheritor of the object, processing instructions from the inheritor regarding the disposition of the object, and coordinating the inheritor's instructions with a physical asset disposition service.

An estate smart contract may be configured to be linked with other contracts (smart or otherwise) that may have dependent terms, such as settlor's will, an inheritor's will, and the like. Operation of an estate smart contract, such as for administration and/or distribution of assets of an estate upon a settlor's death, may therefore be configured to automatically identify and enable dependence upon terms of such a linked contract. In examples of smart contract linking for facilitating distribution of estate assets a settlor's will, an estate smart contract may define one or more assets to be placed into the estate upon the settlor's death. An estate smart contract may facilitate renaming the asset, such as a vacation home, into the name of the estate by providing, electronically and/or as physical documents, the authorization needed by a government agency, such as county records department to make the change in ownership name. Such a smart contract action may instead occur based on other terms defined in the estate, such as in response to an estimated value of the vacation home exceeding a resale threshold.

An estate smart contract may be configured to facilitate estate administration and/or asset distribution based on terms of an estate. An exemplary term may involve age limits for estate asset distribution, such as a minimum age after which a portion of an estate designated in an estate smart contract for an inheritor may be distributed free of trust to the inheritor. Upon detection or notification of the inheritor reaching the minimum distribution age (e.g., based on verifying a birth certificate of the inheritor and setting a date for distribution based thereon), the smart estate contract may automatically notify an estate trustee and the inheritor of the assets and may further provide the inheritor access (e.g., email a username and password of a brokerage account) to those assets designated for age-based distribution. Another exemplary estate term may relate to generations of descendants so that, for example, distribution of estate assets to a descendant of an inheritor may be free of trust. Another exemplary estate term that may be configured into an estate smart contract may relate to a requirement for the presence of one or more trustees at one or more phases of the estate. In a basic example of a smart contract facilitating estate distribution with trustee management, an estate smart contract may provide a portal through which a trustee may be designated and/or through which a designated trustee may decline designation. Such a portal may be linked to a trustee control facility of the estate smart contract that may automatically designate an alternate trustee (if an alternate trustee has been identified or is identifiable) and/or notify a third party, such as a personal representative of the settlor, a descendant of the settlor, and the like of a need to designate a trustee.

An estate smart contract may be configured with tax optimizing logic that may, based on value of assets of an estate, reconfigure an estate to gain tax benefits for one or more inheritors, such as by splitting an estate into two or more related estates with suitable taxable designations.

In examples of a smart contract implementation, a smart contract may be configured to close a contract or a portion thereof. Contract terms may include severability that facilitates closing portions of a contract, such as one or more terms of a contract, without causing an entire contract to be closed. Contract terms may include conditions under which a contract may be closed. Closing of contracts, or portions thereof may include one or more parties to the contract exercising a right, optionally a conditional right, to close. Closing contracts, or portions thereof may automatically include closure, such as when a term of a contract is satisfied (e.g., when a delivery is confirmed, when a deliverable is not made timely, and the like).

Smart contracts may be configured to facilitate closing a contract or portion thereof by evaluating, from time to time, compliance with and/or satisfaction of terms and conditions of the terms of a contract. A smart contract that is, for example, executable on one or more processors may be configured with a contract term evaluation facility, such as a set of logic executable on the one or more processors that receives as inputs data representative of conditions of the contract that facilitate determining adherence to a contract term, such as a contract term start date, end date, start condition, end condition, and/or a derived value based on measurable elements of the contract (e.g., a minimum level of inventory at a local distribution depot), and the like. Such a contract term evaluation facility may be controlled by other terms in a contract, and therefore may process data representative of another contract term, such as a time period over which the inventory level must be replenished up to the minimum level. In this example, the contract term evaluation facility may generate a term evaluation result that may impact a state of the contract from "active" to "pending closing." The smart contract may further include contract state processing logic that may, based on conditions activated when a portion of the contract is pending closing, perform actions to configure transactions and the like that can automatically be executed to close the contract (or the relevant portion thereof) if the conditions required to change the contract state back to "active" are not met, such as if inventory records remain below a minimum value beyond the replenishment period. An example of transactions that may be loaded for automatic execution by the smart contract may include transfer of funds from an escrow account to a private account of a participant defined in the contract for receiving the escrow balance upon closing of at least the relevant portion of the contract. Another example transaction may include issuance of an amended and restated contract with the closed portion removed. In embodiments, closing a portion of a contract may impact terms in other portions, such as for commercial contracts, payment schedules. Therefore, a smart contract may automatically adjust these other terms in the amended and restated contract.

A smart contract may close an entire contract by taking actions defined in contract closing terms, such as automatically returning a deposit to a buyer, notifying at least the participants (and any other parties identified in the closing terms) of the contract closure, renegotiating terms of the contract, signaling to a request for proposal facility to reactivate requesting proposals (or activating a backup contract with a third party) for work defined in the contract that was not delivered, and the like.

In examples of a smart contract implementation, a smart contract may be configured to trigger a remediation event. Parties may enter into an agreement that may be memorialized by a contract, optionally a smart contract that may define events that contribute to compliance with contract terms as well as events that may be triggered based on terms in the agreement, such as contract terms. One such event that may be triggered based on terms in an agreement is a remediation event. In embodiments, a remediation event may direct mediation actions to make one of the parties of the agreement whole when another party of the agreement fails to comply with terms of the agreement. In embodiments, a remediation event may cause remediation actions when conditions that are outside of control of the parties to the agreement occur, such as a natural disaster, pandemic, and the like. A smart contract may be configured to understand conditions that may require triggering a remediation event. In embodiments, a smart contract operable on one or more processors may be configured with machine learning logic that may, over time, identify patterns of one or more parties to the agreement regarding actions/conditions that the smart contract is monitoring to ensure compliance. The smart contract may determine that a party consistently provides a deliverable identified in the contract at the end of an extended delivery grace period while requiring early payment. In this example, the smart contract may trigger a remediation event that may initiate renegotiation of the terms of the agreement. Another remediation action that the smart contract may trigger is to reprioritize compliance with terms of the agreement so that lack of compliance with other terms that had smaller impact on the agreement may be increased in importance, such as to be flagged to the affected party and/or to trigger other actions that would, under nominal contract execution conditions, not be triggered.

In examples of a smart contract implementation, a smart contract may be configured to deliver crypto keys to a digital product (private key event). Conducting secure digital transactions over a network may require use of crypto keys, such as public and private crypto keys to ensure, among other things, that participants of such a transaction can be digitally verified. Smart contracts may be utilized to facilitate conducting secure digital transactions over a network by, among other things delivering crypto keys. A smart contract may further be utilized to facilitate use of digital products, such as by delivering crypto keys to the digital product. In a smart contract example, two parties may desire to enter into an agreement for use of a digital product to conduct transactions on their behalf, such as a digital product that conducts secure transactions among parties for payments and the like. This agreement may be constructed as a smart contract that may be provided with public crypto keys for the participants so that transactions defined by the agreement can be conducted electronically, such as through the use of a Blockchain and the like. Such a smart contract may be configured with not only the public crypto keys of the participants, but other keys that are required to conduct the transaction, such as crypto keys for digital products (e.g., a mobile transaction platform) to enable the digital product(s) to play a role in the execution of the agreement. A transaction conducted under such an agreement may involve the smart contract signaling to the digital product that participant A in the agreement wishes to perform a transaction with participant B of the agreement, such as sending digital currency to participant B. The smart contract may, optionally, validate the transaction is in compliance with the terms of the agreement (e.g., ensure that the payment to participant B meets a condition of the contract) and then forward a public encryption key for participant B (optionally along with transaction instructions) to the digital product. The smart contract may be configured with conditions, terms, and logic that is processed to ensure that the use of the digital product is also in compliance with the agreement (e.g., that the transaction amount does not exceed a maximum threshold for use of the digital product and the like).

In examples of a smart contract implementation, a smart contract may be configured to configure and execute auctions. In embodiments, rules of an auction, such as an established minimum bid, bid increments, financial or other qualifications of bidders, obligations of bidders when making a bid for an item, obligations of auction participants offering items at the auction, forms of payment, and the like may be configured as features of a smart auction contract. Bidders may be participants to the auction smart contract with a set of terms of the contract established and enforced for their participation, such as auction attendance, establishment and use of proxies, and the like. An auction smart contract may comprise a functional, computer executable contract that automates establishing and enforcing binding agreements among buyers, sellers, an auction service, third-parties, such as item transportation and warehousing providers and the like. An auction coordination service may configure an auction smart contract with pertinent information that facilitates operation of an auction from initial auction planning through to delivery of auctioned items, such as time, place, bidding process, requests for items for the auction, allocation and use of auction proceeds, terms for third-parties to participate in the auction, and the like. In embodiments, an item-specific smart contract may be configured for each item for auction with its own terms, such as minimum bid, acceptable form of payment, and the like. Each item-specific smart contract may be linked (e.g., logically, operationally, and the like) with one or more smart auction contracts, such as a master smart auction contract. An example of logical item-specific smart contract linking with a master smart auction contract may include sharing certain information, such as auction location, auction payment processor, item order of auction (e.g., which item is auctioned before and which item is auctioned after the item for which an item-specific smart auction contract is configured), and the like. In examples of a smart item-specific auction contract, terms such as minimum bid amount (bidding does not start until a participant makes an offer of at least the minimum bid amount), payment facilitator (vendor, such as a credit card transaction service, digital currency service, and the like), service fee recovery supplemental amount (e.g., in addition to the bid amount, an auction service fee, logistics vendor fee, charitable donation fee, and the like), distribution of proceeds based on a fixed amount per item and/or a percentage of auction price from a winning bid (e.g., 2% auction service fee, 5% or $25 logistics fee whichever is less, 3% charitable donation rider and the like) may be configured as logical terms that are enforced by execution of a smart auction contract.

In examples of a smart contract implementation, a smart contract may be configured to facilitate distribution of currency tokens and/or tokenized digital knowledge. Allocation and distribution of currency tokens, digital knowledge tokens, digital assets, and the like may be based on one or more terms of an agreement or a set of agreements that establish the who, what, why, and when of digital token distribution. A typical contract for controlling digital token distribution, such as currency tokens, digital knowledge token and the like, may be embodied as a smart contract configured to operate within the agreement terms. Elementary examples of capabilities of a smart contract configured for digital token distribution include automating reallocation of digital assets among participants of an agreement embodied as a digital contract based on terms of a contact, such as based on financial market movements, and the like. Terms of the agreement for conducting reallocation may be further dependent on use of a marketplace, such as a distributed financial transaction platform (e.g., a Blockchain-based transaction platform and the like.) A smart contract may be configured with interfaces and operational logic that identify participants of the agreement on or in association with the distributed financial transaction platform and, based on the relevant terms thereof, conduct or cause to be conducted secure transactions on the platform for the reallocation. Such a smart contract may be configured with currency distribution instructions and the like, such as digital asset accounts for a payor participant of the agreement (e.g., a buyer) and payee participant of the agreement (e.g., seller), terms and timing of such distributions, and the like. The smart contract, or portions thereof may operate, such as on a processor of one or more servers, IoT devices, and the like to cause the currency distribution to be effected. As an example, an IoT enabled digital currency kiosk may be configured with a portion of a smart contract that controls, at least in part, operation of a fleet of IoT enabled kiosks. The kiosk (or, for example, a processing portion thereof, such as a set of computing logic of the IoT enabled kiosk) may be defined as a participant in the smart contract that can be authorized to receive inputs from other participants (e.g., payors) for conducting transactions of the smart contract. Input received through the kiosk smart contract participant may be shared with other portions of the smart contract, which may optionally be operated by other network-accessible computing systems, and processed according to the currency distribution terms of the underlying agreement embodied as a smart contract.

In examples of a smart contract implementation, a smart contract may be configured to configure and manage the exchange of digital knowledge across marketplaces, exchanges, transaction platforms, and the like. In a value-chain network example, a first marketplace may facilitate raw materials transactions. A second marketplace may facilitate finished goods materials wholesale transactions. A third marketplace may facilitate retail transactions of the finished goods. A smart marketplace exchange contract may be configured with computer executable functionality to process terms of a knowledge-sharing/exchange agreement among some of these marketplaces. As an example, a smart contract may be configured to facilitate exchange of knowledge regarding waste of raw materials resulting from production of finished goods made available in finished goods marketplace(s). Such an exemplary smart contract may further be configured to facilitate sharing other production byproduct information (e.g., carbon emissions and the like) among marketplaces so that pricing and/or terms of purchase of finished goods may be adapted based thereon. A smart contract may be configured to enforce terms of material transfer from one marketplace (e.g., distribution) to another (e.g., retail), such as proper reuse/recycling of packaging material by the retail marketplace. This may be enabled by, for example, packaging location-tracking devices that provide information to the smart contract to ensure packaging material is routed per the terms of the agreement and failure by a party to adhere to such terms will trigger actions of the smart contract, such as retention of a deposit paid for the packaging, increase in automated invoice settlement, and the like.

In examples of a smart contract implementation, a smart contract may be configured to manage Electronic Medical Records (EMR) for various actions/requirements thereof, such as consents, scope of consents, document access, and the like. Access to and use of electronic medical records may be subject to regulatory requirements that are designed to ensure a high degree of privacy, security, and integrity. Access by providers, insurers, billing departments, patients, and the like must comply with a range of authorization that generally stems from patient consent. A smart contract may be configured to operate as a primary control for electronic medical record access based on, for example, patient consent. EMR access systems, such as electronic record systems used by emergency room medical staff and the like, may be configured with one or more consent portals that direct requests for EMR access to an EMR smart contract where at an access request can be processed to ensure that it meets the consent requirements thereof. In embodiments, an EMR smart contract may be configured to detect such access requests (e.g., by a medical imaging system to import a set of medical images (e.g., MRIs and the like) to a patient's EMR). Information in or associated with the request, such as a degree of urgency of the request, a provider making the request, a location of a facility where the records will be viewed (e.g., a domestic office within a patient's home state, a location outside of a home state of the patient, a foreign jurisdiction and the like) and others may be input to control functions of the smart contract that may process the request, determine the required degree and scope of access consent (e.g., an explicit consent given more than the consent validity duration may be deemed an invalid consent except when a life threatening condition of the patient accompanies the request), and based thereon authorize access by a requesting EMR access system. The EMR smart contract may provide automated authorization for access only to records explicitly authorized in a consent to a medical records access management facility participant of the underlying EMR smart contract. The requested records that comply with the consent may, as a result of the smart contract operation, be caused to be made available to an initiator of the request.

In examples of a smart contract implementation, a smart contract may be configured to manage clinical trials. Aspects of clinical trials that a smart contract may be configured to manage may include, without limitation, tracking IRB approvals, patient enrollment and incentive payments, collaboration of physicians and facilities, pharma-related aspects, clinical trial data access, authentication, and the like. In embodiments, a master smart contract may be configured to actively link with other smart contracts that control portions of a clinical trial. As an example, physician collaboration may be controlled by a smart contract to which physicians, facilities, and the like may be participants. This smart contract may interact with a clinical trial master smart contract so that, under the terms of the physician collaboration smart contract, the participant physician may become participants of the master clinical trial smart contract with all of its terms and conditions taken into consideration. Within this example, a physician may opt out of participation in the clinical trial smart contract, but may remain bound by the physician collaboration smart contract for collaboration that is separate from the clinical trial. A master clinical trial smart contract may further link with an intellectual property development engagement smart contract that may control terms under which intellectual property developed for the clinical trial may be owned, controlled, and monetized.

In examples of a smart contract implementation, a smart contract may be configured to manage medical grants. Aspects of medical grants that may be managed by a smart contract include grant funding, grant resources, and grant parties (patients, providers, research institutes, grant providers, government agencies, grant findings consumers, medical field affiliates, Nobel prize record keeping, and the like). A medical grant management smart contract may facilitate control of government grants, industry funded grants, higher-education funded grants, privately funded grants, and the like. A medical grant may be offered with a set of terms and conditions that a grantee must agree to observe for the funding to be provided. These terms and conditions may include a phased set of grant disbursements. A medical grant management smart contract may be configured with interfaces through which participants of such an agreement may provide relevant information for compliance with the terms of a grant. As an example, a medical grant term may require that candidate participants in a portion of the grant complete a qualification questionnaire. An interface to a medical grant management smart contract may be configured to receive each completed questionnaire and/or a summary of completed questionnaires. A grant term compliance function of the smart grant may monitor such an interface to receive and process (e.g., count/validate/document/serialize) questionnaire-related information input to the interface. Such a function may operate cooperatively with a funding disbursement function of the smart contract that may, based on a result of processing the received questionnaire information, determine if and how funds that are conditionally based on satisfaction of a questionnaire term are to be released. Such a funding disbursement function of a smart contract may further interact with a funds disbursement auditing function that, based on an auditor's authorization (optionally an automated authorization), may cause the conditional funds to be disbursed to a grantee account.

In examples of a smart contract implementation, a smart contract may be configured to manage consultants. In embodiments, a consultant management smart contract may facilitate management of consultant administrative aspects, such as consultant payment arrangements and execution, consultant conflict of interest vetting, consultant statement of work agreements, and the like. A consultant administrative management smart contract could receive information from a statement of work agreement (itself optionally a smart contract) that could be used to establish a conflict of interest criteria (that may be embodied as a functional term in a smart contract). Consultants may provide conflict of information vetting information to such a consultant administrative management smart contract (e.g., a list and optional description of current work assignments, work history, current and prior affiliations, and the like). Optionally, a smart contract could employ public and third-party information harvesting services, such as general Internet searches, social-media and business-media information gathering platforms, industry information platforms, consultant referrals, similar consultant information, and the like to gather and optionally vet information for at least one of determining potential conflict items requiring further follow-up (e.g., by a human, artificial intelligence system and the like) and deciding whether a conflict of interest exists for a given consultant. A consultant agreement may further define a conflict of interest petition process by which a consultant could petition to be exempt from some portion of a potential conflict of interest. A corresponding smart contract may automate submission, processing, and authorization (with optional human review) of conflict of interest condition waiver. In examples, a conflict of interest term may identify employment with or consultation for for-profit forestry companies as a conflict. The smart contract may examine government forestry programs that use consultants and/or contracting firms and determine that the specific consultant is/was named as a consultant to one of these programs. A smart contract may further receive and/or retrieve payment information for a relevant government forestry program and automatically determine if the specific consultant is a payee for services to the program. Based on a result of this finding, a smart consultant administrative management contract may reject a petition of waiver or may grant a petition of waiver. The smart contract may handle the waiver petition automatically, and/or with human assistance.

In examples of a smart contract implementation, a smart contract may be configured to track publications, such as publications for which contract terms are established, such as for publication distribution, selling price, and the like. A publication tracking smart contract may be configured to track a wide range of publications, such as digital publications, newsletters, email campaigns, physical publications, newspapers, newsletters, regulatory publications, updates to terms of sale/use, and the like. Terms of a publication agreement may include advance payments to an author to develop the content of the publication. These terms may include demonstrable milestones, such as a minimum number of pages, meetings with editors, and the like within timeframes called out in the agreement. In embodiments, successful completion of milestones may impact other terms of a publication agreement, such as further advance payments, distribution channel priority, and the like. A publication tracking smart contract may be configured with a portal into which an author may submit work product that is intended to demonstrate progress toward one or more milestones. Optionally, a publication tracking smart contract may include methods and systems that monitor deliverable activity, such as a module executing on or in association with an author's writing system (e.g., a personal computer, browser, and the like) that monitors deliverable impacting activity, such as key entries, file updates, and/or time spent working on a deliverable (e.g., a draft manuscript and the like). Deliver-side terms of a smart contract may include deliverables based on a number and timing of copies of a publication delivered to retail outlets (e.g., newsstands, bookstores, and the like). A smart contract may interface with various publication production, delivery, distribution, end-reader sales systems to capture information that may impact a determination of satisfactory progress toward and/or completion of publication delivery terms of such an agreement. Other forms of publication tracking may include an end user portal of the smart contract through which customer touch point activity (e.g., a customer scanning a QR code on a back cover of a publication) may be channeled so that third-party agreements associated with the publication may be maintained.

In examples of a smart contract implementation, a smart contract may be configured to manage media licensing. A smart media license contract may manage a range of media license aspects including without limitation content licensing, music sampling, talent contracting, royalty tracking and distribution, residual tracking, pay-per-play tracking, pay-as-you-go usage, such as within video games, and the like. Configuring a smart media license contract may include configuring a list of content for which the contract defines licensing terms, such as content owner fees, distribution fees, advertiser fees, and the like into one or more data structures. The information in such data structures is accessible by a computing system (e.g., a processor, server and the like) that executes a smart contract algorithm that applies logic representing contract terms (e.g., what each advertise has to pay for ad placement associated with an instance of content) to data representative of content activity, such as delivery and rendering an instance of the content by a video rendering service on a smart phone and the like. A smart media licensing contract may, from time to time, capture information from the data structure, to update compliance with content licensing terms of the contract. In embodiments, a smart content licensing contract, or portion thereof, may be deployed into and/or with a gaming system, game program, or other gaming feature (e.g., virtual reality devices, and the like). A deployed portion of the smart contract may address pay-as-you-go content usage within the scope of game play by the user, such as by updating a portion of the data set to reflect usage view-time of content and related features.

In example implementations, a smart contract may be configured to order supplies or materials. The supplies or materials may be ordered in response to fulfillment of a triggering condition, such as a triggering condition related to an amount of supplies or materials stored, needed, requested, contracted for, and the like. The smart contract may be configured to order the supplies or materials from a predetermined source, such as a particular vendor. The smart contract may be configured to have the supplies or materials sent to a predetermined location, such as an address of a customer, of a supplier, and the like. Attributes of the supplies or materials such as source, cost, amount, quality, etc. may be determined and encoded into the smart contract when the smart contract is created, the smart contract may be updated to retrieve information regarding attributes of the supplies or materials after smart contract creation, and/or the smart contract may include logic that allows the attributes of the supplies or materials to be determined by the smart contract, by the distributed ledger, and/or by a related system or data source. The supplies or materials may include any suitable type of supply or materials, such as raw goods, partially manufactured goods, manufactured goods, natural resources, computational resources, energy resources, and/or data management resources.

In example implementations, a smart contract may be configured to release funds and/or assets to a party. The release of funds and/or assets to a party may be performed in response to fulfillment of a triggering condition, such as delivery of goods and/or services by one or more parties. The funds and/or assets may be predetermined at creation of the smart contract and/or may be determined after creation of the smart contract. The funds may include fiat currency, digital currency, or any other suitable type of currency. The assets may include physical assets such as property, resources, supplies, materials, land, tools, equipment, and/or title to the same. The assets may also or alternatively include digital assets, such as processing power, cloud storage capability, digital signatures, programs, files, data, and the like. The smart contract may include logic configured to determine timing, quantity, quality, source, or any other suitable condition or attribute related to release of the funds and/or assets.

In example implementations, a smart contract may be configured to update a government/regulatory database. The government or regulatory database may be updated in response to fulfillment of a triggering condition, such as fulfillment or lack of fulfillment of one or more regulatory requirements by one or more parties. The government or regulatory database may include any suitable database, such as a municipal database, a state database, a federal database, a foreign database, a database of a government agency, and the like. The database may be updated with any suitable data, such as data related to one or more parties to the smart contract, data related to one or more entries on the distributed ledger, data related to one or more amounts of currency and/or pieces of physical or digital property, etc.

In example implementations, a smart contract may be configured to issue a notice of breach to a party. The notice of breach may be issued in response to fulfillment of a triggering condition, such as a material noncompliance with terms of an agreement by one or more parties to the agreement. The smart contract may be configured to automatically detect breach by a party, such as by monitoring one or more conditions related to breach. An example of a condition related to breach may be nonpayment by a party by a particular date and/or time. Another example of a condition related to breach may be failure to deliver or adequately deliver goods and/or services according to one or more terms of an agreement between parties. The notice of breach may include a transmission to the breaching party, such as by email, facsimile, instant message, text message/SMS, post on a website and/or social media, traditional mail, publication (e.g. in a newspaper), process server, and/or any other suitable means of issuing a notice of breach.

In example implementations, a smart contract may be configured to change an exchange rate between currencies and/or tokens. The change in exchange rate between currencies and/or tokens may be performed in response to fulfillment of a triggering condition, and/or may be performed at one or more predetermined times, such as according to a schedule. An example of a triggering condition that may trigger change of an exchange rate by the smart contract may be a value of one or more currencies and/or tokens changing, such as the values thereof exceeding a threshold. The currency may be a fiat currency, a digital currency, or any other suitable type of currency. The token may be a digital token representing a digital currency, a digital token representing ownership or rights to one or more digital and/or physical goods, a digital token representing a program, a digital token representing information stored on the distributed ledger, or any other suitable type of token.

In example implementations, a smart contract may be configured to increase or decrease an interest rate. The increase or decrease in an interest rate may be performed in response to fulfillment of a triggering condition, such as payment of a predetermined amount of debt by a party to an agreement and/or making of a down payment above a threshold by a party to an agreement. The increase or decrease may be made to an interest rate of any suitable type of loan or security agreement. The increase or decrease of the interest rate may be made by adjusting one or more interest related to an agreement transacted on the distributed ledger or an agreement transacted separate from the distributed ledger, such as by a bank or mortgage company.

In example implementations, a smart contract may be configured to initiate and/or perform foreclosure on a piece of collateral. The foreclosure may be initiated and/or performed in response to a fulfillment of a triggering condition, such as default by a party to an agreement in collateral is used to secure a loan. The foreclosure may be initiated and/or performed according to terms encoded into the smart contract. The foreclosure may be initiated and performed by the smart contract itself, or may be initiated by transmitting an initiation signal external to the smart contract, such as to a financial institution.

In example implementations, a smart contract may be configured to place a lien on a piece of property involved in an agreement. The lien may be placed upon creation of the smart contract and/or upon configuring of the contract with terms of an agreement made between a plurality of parties. The lien may be placed in response to fulfillment of a triggering condition, such as use of a piece of digital and/or physical property to secure a loan agreement. The lien and/or conditions related to the lien may be stored on the distributed ledger and/or may be encoded into the smart contract. The lien may be placed on a digital item that is stored on the distributed ledger. The smart contract may additionally include one or more conditions related to release of the lien upon fulfillment thereof.

In example implementations, a smart contract may be configured to record a change in title. The title may be a title to one or more instances of digital property, one or more instances of physical property, one or more instances of real property, or a combination thereof. The change in title may be recorded in response to fulfillment of a triggering condition, such as transfer of property from one or party to another in an agreement, or such as payment or rendering of services by one party of an agreement in exchange for property by another party to the agreement. The title may be stored on the distributed ledger. The recordation of change in title may be performed by transmission of one or more signals and/or documents to one or more recipients external to the distributed ledger, such as to a county registrar or to a digital title database.

In example implementations, a smart contract may be configured to make a UCC filing. The UCC filing may be made to any suitable recipient, such as a government office. The UCC filing may be made in response to fulfillment of one or more triggering conditions, such as acquiring of an interest in the property of a first party by a second party according to an agreement between the first and second parties. The agreement may be stored in the smart contract. The UCC filing may be made by transmitting one or more signals and/or documents to a suitable recipient. The UCC filing may be stored on the distributed ledger.

In example implementations, a smart contract may be configured to extinguish a UCC filing. The UCC filing may be extinguished by transmitting a signal, digital document, or any other suitable notice or data to a suitable recipient, such as a government office. The UCC file may be extinguished in response to fulfillment of one or more triggering conditions, such as payment of a debt by a first party to a second party, the payment of the debt calling for release of an interest of the second party in a piece of property owned by the first party according to terms of an agreement. The agreement may be encoded in the smart contract.

In example implementations, a smart contract may be configured to allocate payments among multiple parties. The allocation of payments may be performed in response to fulfillment of one or more triggering conditions, such as initiation of an agreement between the parties amongst whom the payments are to be allocated. Another example of a triggering condition that may cause the smart contract to allocate payments among multiple parties is delivery of goods and/or services by one or more of the parties to whom payments are to be allocated. The payments may be allocated according to terms encoded in the smart contract, stored on the distributed ledger, and/or external to the distributed ledger. The payment may be allocated according to payment terms encoded in the smart contract at creation of the smart contract, upon agreement between the multiple parties, or at any time or upon fulfillment of any suitable condition.

In example implementations, a smart contract may be configured to allocate profits among joining owners. The allocation of profits may be performed according to a formula, such as terms of an ownership and/or partnership agreement that may be encoded in and/or imported to the smart contract. The formula and/or agreement may be stored on the digital ledger. The formula and/or agreement may be of any suitable type, such as ownership of a business, ownership of one or more securities, co-investment in one or more types of tangible and/or intangible properties and/or securities, and the like.

In example implementations, a smart contract may be configured to make a payment. The payment may be made in response to fulfillment of one or more triggering conditions, such as according to a payment schedule of an agreement between parties. The payment may be made by transferring one or more digital currencies and/or balances stored on the digital ledger. Additionally or alternatively, the payment may be made by transmitting a signal such as a wire transfer signal to a recipient outside of the distributed ledger network, such as to a bank. The payment may be made to one or more parties to an agreement encoded in the smart contract, and/or may be made to one or more parties for the sale, license, lease, and/or transfer of goods stored on the distributed ledger.

In example implementations, a smart contract may be configured to send a gift. The gift may be sent in response to fulfillment of one or more triggering conditions, such as at a certain date or time. The gift may be sent from one party to another and/or to or from any users of the distributed ledger, parties to agreements stored thereon, and/or owners or lessees of digital property and/or currency stored thereon. The gift may include digital currency and/or property, fiat currency, physical property, title to digital and/or physical property, or any other suitable gift.

In example implementations, a smart contract may be configured to trigger a gaming event. The gaming event may be triggered in response to fulfillment of a triggering condition, such as achievement of one or more gaming incentive goals by one or more parties to an agreement encoded in the smart contract. For example, parties may engage in an agreement encoded in the smart contract for the sale of goods, wherein upon selling a set increment of goods a party may receive one or more game incentives, such as digital game tokens. The gaming event may be related to any suitable game, such as a gamification of a sale or contract. The gaming event may include awarding game incentives such as digital currency to one or more users of the distributed ledger.

In some implementations, smart contracts may be configured, for example, to confirm receipt of a shipment at a delivery location, instantiate another smart contract or sequence of smart contracts, manage franchise agreements (such as tracking and applying franchise rules), manage government contracts, manage real estate (such as managing mortgages and lending, title, insurance, or the like), manage transportation assets (such as managing title, insurance, emissions, or the like), manage financial contracts, manage corporate agreements (such as statements of work, purchase agreements, employment agreements, mergers, acquisitions, insurance, or the like), track data privacy, manage wills or trusts, perform outcome-dependent transactions, or the like.

In some implementations, smart contracts may be invoked upon the occurrence by one or more of the following events: social media events, social impact measurements (including number of followers, number of posts, number of likes, number of views, or the like), weather or disaster events (including severe weather damage, crop destruction, fires, floods, pandemics, earthquakes, hurricanes, war, or the like), the purchase of a product or service, changes related to collateral (including tokenization of collateral, movement of collateral, damage to collateral, depreciation of collateral, or the like), covenant events (such as bonds or loans linked to IoT devices), machine-to-machine events (including digital twins contracting with each other, IoT agents contracting with each other, machine-to-machine or digital twin payment network events, or the like), advertising events, marketing events, gaming events, quantum services events, sporting events, gambling events, security events, energy markets events, and product release events.

In embodiments, the platform 20500 may present a GUI to a user that requests to generate a new smart contract. In embodiments, the platform 20500 may provide a set of smart contract templates that the user may select based on the type of transaction that the user has requested. For example, if the marketplace is configured for buying and/or selling interests in real property, the platform 20500 may provide the user with one or more options for generating smart contracts that relate to real estate transactions. The user may be given a set of questions that, when answered, result in the platform 20500 selecting the smart contract template that is optimized for the user's intentions (e.g., a lending-based smart contract template, a smart contract template governing the sale of an interest in a real estate property, a commodity trading smart contract template that governs a forward contract, or the like). Alternatively, the user may be provided with a menu of available smart contract templates, and the user may select one of the smart contract templates from the menu.

Upon determining a smart contract template, the platform 20500 may provide an interface (e.g., a GUI) that allows a user to set the parameter values corresponding to the determined smart contract template. For example, in a smart contract governing a futures contract with respect to a commodity, the user may set the type of commodity, a number of units (e.g., barrels of oil, bushels of wheat, ounces of gold, or the like), a contract price to be paid for the commodity, the execution date of the futures contract, the contract price, and other suitable parameter values. In examples, in a smart contract governing the sale of a physical asset, the seller may set a first price if a buyer is located within the United States and a second price if the buyer is located outside the United States. In this example, the user sets parameter values that are used to parameterize triggers, namely a geographical restriction. In this example, the platform 20500 may generate a smart contract that has location-sensitive pricing. Thus, when a buyer seeks to accept the terms of the smart contract, the smart contract may verify a location of the potential buyer and may configure the terms of the contract (e.g., the price and/or other suitable terms, such as logistics information, location-specific tax information, or the like) based on the location of the potential buyer. It is noted that in other examples, users may parameterize smart contracts with parameter values corresponding to triggering actions, such as initiating a certification process associated with the transaction, initiating a reporting process associated with the transaction, configuring logistics information associated with the transaction, reconfiguring of terms (e.g., premium rates, interest rates, contract price, delivery date, payment due date, and/or the like). It is appreciated that depending on the type of smart contract, the types of data that may be used to parameterize a smart contract will differ. As with the other embodiments the involve parameterization, parameterization may be undertaken by robotic process automation or other artificial intelligence systems, such as trained on a training set involving parameterization by a set of experts.

In some implementations, a smart contract may include one or more event listeners. In embodiments, an event listener may be a listening thread that monitors one or more data sources to determine when a certain event occurs, such as whether a triggering condition is met. In embodiments, an event listener may subscribe to a data feed, query an API, receive notifications, query a database or other data source, passively receive data from a set of Internet of Things (IoT) devices (consumer IoT devices and/or industrial IoT devices and/or sensors), or otherwise receive/retrieve data from a data source to obtain a specific type or types of data. For example, a smart contract governing an insurance policy that covers an industrial facility may include an event listener that queries a municipality database, such as via an API, to verify that the owner of the industrial facility has paid its taxes and to identify the presence of changes in title, liens, or encumbrances on the property. Continuing the example, a smart contract governing the insurance contract may include an event listener that connects to an industrial internet of things (IIoT) sensor system (or "sensor system") of the industrial facility to receive one or more sensor streams. For example, the smart contract may be parameterized with a set of IP addresses and authentication credentials to access a sensor system (e.g., via a set of edge devices of the sensor system) to access a set of data streams from the sensor system. In some embodiments, an edge device of the sensor system may include an intelligence system that filters the stream (such as to deliver information relevant to the smart contract parameters while omitting unnecessary information) and/or performs one or more analytic operations on the sensor data collected from a set of one or more sensors (such as to calculate a metric that is used as a parameter of the smart contract) and may communicate one or more data streams based on the filtering and analytics to the system hosting the smart contract. The smart contract event listener may listen to such streams to verify one or more triggering conditions. In this way, the smart contract may ingest sensor data and determine whether one or more triggers have occurred. In response to determining that a defined set of triggers have occurred, the smart contract may execute one or more smart contract actions. For example, in the context of an insurance contract, the detection of a warning condition by the smart contract that is derived from sensor data received from a sensor system associated with an industrial facility may result in an action that adjustments a premium rate of the insured. In this way, the smart contracts may be configured to receive IoT data (e.g., IoT-collected sensor data, IoT-collected health data, IoT-collected location data, and/or the like) to verify one or more triggers and, in response, to initiate one or more smart contract actions. It is appreciated that smart contract event listeners according to other example embodiments of the disclosure may listen for data obtained from additional or alternative data sources.

In embodiments, the platform 20500 can support smart contracts of a number of different types for a number of different types of marketplaces. As used herein, references to "supporting smart contracts" may refer to the platform 20500 generating and deploying a smart contract on behalf of a user and/or facilitating the generation of smart contracts by users of the platform 20500 in a decentralized manner (e.g., generated from a user device that writes the smart contract to a distributed ledger), as well as generating and deploying a smart contract automatically, such as by an artificial intelligence system and/or set of services (e.g., involving robotic process automation) within the platform 20500 or linked to the platform 20500, such as via one or more interfaces, such as application programming interfaces. Examples of types of marketplaces/transactions that may be supported by the platform 20500 may include, but are not limited to, asset-based transactions, insurance transactions, supply-chain transactions, commodity/stock-based transactions, cryptocurrency transactions, intellectual property transactions, and/or any other types of transactions described herein or in the documents incorporated by reference herein, and may include the core transactions that characterize marketplaces (e.g., purchase and sale of bonds in an equities market), as well as other transactions, such as microtransactions and exchanges that are involved in workflows or processes (e.g., a transfer of value in exchange for priority within a prioritization system, providing value to induce behavior, such as viewing an advertisement, and many others), and many others.

In some embodiments, the platform 20500 may support smart contracts that govern transactions involving assets. In these embodiments, a smart contract may include information defining the asset (e.g., an asset identifier, a serial number, a name, a make/model, or the like) or assets that are subject to the transaction, the price of the asset, the number of units, or the like. Furthermore, as the smart contract may be generated by a buyer, a broker, a market maker, a seller, or the like, the smart contract may or may not define the parties to the transaction, or the types of parties that are permitted to transact (e.g., limiting to licensed broker/dealers for transactions in regulated securities where required). For instance, a buyer wishing to purchase a vehicle may generate a new smart contract via the platform 20500 that offers a price to purchase a particular vehicle (e.g., make, model, and year) with one or more additional requirements (e.g., <50,000 miles, single owner, under warranty, pickup location/area, and/or the like). In this example, there is no seller identified in the smart contract, but the buyer may be identified in the smart contract. In response, the platform 20500 may generate a smart contract that includes the triggering conditions for completing the sale of the vehicle and a smart contract action that initiates the transfer of title from the seller to the buyer. This may include an event listener or other smart contract element that requires the buyer to prove that he or she has the cash and/or adequate financing to purchase the vehicle and an event listener or other smart contract element that requires a seller to prove that they have title to a vehicle meeting the buyer's requirements. In embodiments, the platform 20500 may be configured to use automation systems, such as artificial intelligence, such as one or more classification systems that is trained, such as using a model and/or a training set of human-labeled data, to discriminate between valid and invalid inputs that are offered to satisfy applicable triggers in the smart contract. For example, such systems may be trained to process account data to determine adequacy of adequate financial strength of the buyer and to process title records (e.g., title certificates) to determine the adequacy of the seller's claim to title. Such artificial intelligence systems used for classification may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein. In this example, the prospective buyer may upload a document that proves that he or she has secured financing to cover the defined price and the seller can upload a copy of the title of the vehicle as well as a certified statement declaring that the other requirements are met. Alternatively, if the vehicle is a connected vehicle, the seller may provide access to the vehicle data, whereby the warranty status and the mileage of the vehicle may be confirmed.

In embodiments, the platform 20500 may support smart contracts that govern insurance policies. In embodiments, an insurance policy smart contract may be generated in response to a party seeking to insure an asset, a property, a business, a person, or the like. Insurance policies may take any form of insurance, such as health insurance, life insurance, homeowner's insurance, disaster insurance (e.g., fire, flood, hurricane, pandemic, or the like), property insurance, auto insurance, third party liability insurance, business interruption insurance, disability insurance, or the like. In a specific example, a party may agree to a set of terms provided by an insurance provider. In this example, the insurance provider may agree to reduce the premium rates as long as the insured agrees to provide one or more requested data types. In some embodiments, the requested data types may be one or more data streams from a set of IoT devices associated with the insured. For instance, in insuring an industrial facility, the smart contract governing the insurance policy may be configured to receive a data stream of sensor data from an IIOT sensor system distributed within the industrial facility. Either the smart contract, the platform 20500, a third-party service, or an edge device of the sensor system may receive the raw sensor data from the IIoT sensor system and may determine whether the sensor data indicates a deteriorating condition of the facility or a piece of industrial equipment within the facility. In the example, the smart contract may reconfigure the terms of the insurance policy to a provide for a higher premium and/or deductible until the deteriorating condition is resolved (as indicated by the sensor data). In examples, a smart contract governing a health insurance policy may be configured to receive health-related data from a wearable device of the insured individual. In this example, the smart contract may be configured to lower the premium rate if the health-related data indicates that the user is taking actions to improve his or her health. For instance, if the health-related data includes a number of daily steps and the number of daily steps over a period of time (e.g., six months) indicates that the user is taking at least 10,000 steps a day, the smart contract may reduce the premium of the individual by an agreed upon amount (e.g., 100 dollars a month). Conversely, if the smart contract receives negative health-related data (e.g., high blood pressure, low blood oxygen, less than 1000 steps a day over a six month period, or the like) or if the user does not provide the health-related data (e.g., does not grant access to the wearable device), the smart contract may increase the premium to an agreed upon amount.

In some embodiments, the platform 20500 is configured to bind parties to smart contracts via a digital twin, such as where the digital twin offers interfaces that are integrated with and/or linked to the platform 20500, that are shared with the platform 20500, and/or the like. A digital twin platform may be integrated with or into the platform 20500 and/or linked to it, such that the digital twin platform and the platform 20500 share data sources, resources, services, interfaces and the like, including data sources that are accessed to determine triggers for the smart contract and thereby facilitating triggering of actions in the digital twin (and in turn various services, systems, processes and the like that may be controlled by or from the digital twin) in response to actions determined by the smart contract. For example, an ownership transfer of an asset may be affected by a smart contract and automatically reflected in a digital twin that represents the asset, such as by a change in data, metadata, or the like in the data schema that is used to generate the digital twin. In embodiments, the platform 20500 may be configured to serve transaction offers to users in a digital twin (e.g., an "in-twin" marketplace) via an API. In response to a user agreeing to an offered transaction, the user may be committed to a smart contract. In some embodiments, the user may be required to provide additional information and/or access to certain types of data pursuant to the smart contract.

In embodiments, the platform 20500 may support smart contracts that are deployed in connection with forward contracts that are traded via asset trading marketplaces (e.g., commodity trading marketplace, stock trading marketplace, or the like). In embodiments, a trading marketplace may refer to a marketplace that is created to facilitate the brokering of forward contracts. In embodiments, a user may create a smart contract governing a forward contract. In embodiments, a user may select an option to create a new smart contract governing a forward contract. In some of these embodiments, the user may be presented a GUI to provide one or more parameter values. For instance, the GUI may include fields for the user to identify an asset (e.g., a stock or commodity), the long party/buyer, the short party/seller, a contract settlement date, and/or a price (e.g., price per unit or a total price). In this example, the user setting the forward contract may be the short party (e.g., buyer), the long party (e.g., seller), or a third party (e.g., a broker). In the case that either the short party or long party is to be determined, the field may be left unparameterized and may be parameterized when the to be determined party commits to the forward contract. Upon receiving the parameterization values, the platform 20500 may deploy the smart contract (e.g., to a distributed ledger and/or platform 20500 may execute the smart contract). Furthermore, to the extent that one or more parties remain unresolved, platform 20500 may publish the offer of the future contract with a defined price via a corresponding marketplace (e.g., a forward contract marketplace, a commodity marketplace, or an equities marketplace). In embodiments, the platform 20500 may generate and deploy a smart contract in connection with a forward contract automatically, such as by an artificial intelligence system and/or set of services (e.g., involving robotic process automation) within the platform 20500 or linked to the platform 20500, such as via one or more interfaces, such as application programming interfaces.

In some embodiments, the platform 20500 may create and host forward marketplaces. In embodiments, a forward marketplace may refer to an electronic marketplace that provides a medium for counterparties to negotiate and engage in forward contracts. A forward contract may refer to a customized contract between two parties to buy/sell a negotiated quantity of an asset at a negotiated price on a negotiated date. Examples of assets that may be sold using forward contracts include agricultural commodities (e.g., wheat, corn, oranges, cotton, and/or the like), natural resources (e.g., natural gas, oil, gold, silver, platinum, or the like), financial instruments (e.g., stocks, bonds, currencies, or the like), non-traditional assets and/or other suitable commodities (e.g., fuel, electricity, energy, computational resources (e.g., quantum computational resources), crypto-currencies, defined income streams, data streams (such as sensor data, network data and the like), knowledge structures, and the like. In some embodiments, a future contract may require additional terms, such as a delivery location and/or storage location for the assets (if physical assets to be delivered/stored), warranties and/or guarantees (e.g., warranties that the assets will meet certain requirements), or the like. In embodiments, the forward marketplace may provide an interface where parties may negotiate the terms of a forward contract. For example, a first party/user may create an initial offer that includes a set of terms (e.g., asset, quantity, contract expiration date, price, and any other negotiable terms). In response, the forward marketplace may present the offer to the counterparty, which may accept the offer, reject the offer, and/or submit a counteroffer (e.g., by changing one or more terms). The parties may iterate via the forward marketplace in this manner until an offer or counteroffer is accepted or the deal is rejected. In response to the parties agreeing to a forward contract (e.g., one party accepts the other party's bid), the platform 20500 may generate a forward contract based on the negotiated terms. In some embodiments, a forward contract may be formed between parties using the forward marketplace via a bidding process. In these embodiments, a party may generate an offer to buy/sell a set quantity of an asset at a set price on a set date. For example, a seller may offer to sell 10000 bushels of wheat at five dollars a bushel on Nov. 5, 2020. The forward marketplace may publish the offer, such that potential counterparties may view the offer. It is appreciated that the forward market may provide additional information in connection with the offer, such as a rating of the party that generated the offer. If a potential counterparty accepts the offer, the platform 20500 may generate a forward contract between the parties. In a variation of the bidding process, a listing party may define a specific quantity of a specific asset to be completed on a proposed date, and counterparties may provide bids that indicate a price of the contract. For example, a buyer may offer to buy 10000 bushels of wheat on Nov. 5, 2020. In response, potential sellers may offer different prices for the requested asset. Continuing this example, a first seller may offer to a price of four dollars a bushel and a second seller may offer five dollars a bushel. The listing party may then accept one of the bids (e.g., the buyer may accept the four dollar a bushel price). In response to an offer being accepted, the platform 20500 may generate a future contract based on the negotiated terms. In embodiments, the platform 20500 may create and host forward marketplaces automatically, such as by an artificial intelligence system and/or set of services (e.g., involving robotic process automation) within the platform 20500 or linked to the platform 20500, such as via one or more interfaces, such as application programming interfaces.

In embodiments, a forward market orchestration system platform 20500 is configured to generate smart contracts governing forward contracts in response to a completed negotiation process via a forward marketplace. As discussed, a listing party may publish an offer, engage in a series of offers and counteroffers, and/or request offers for a forward contract relating to an asset during the negotiating process. Once an offer has been accepted by both parties (or three or more, depending on the parameters of the contract), the platform 20500 may generate a smart contract and may parameterize the smart contract based on the parameters defined in the accepted offer (e.g., the party that made the bid, the party that accepted bid, the assets at issue, the quantity of assets, the contract price, the contract settlement date, and any other suitable parameters). In some embodiments, the platform 20500 may deploy the smart contract once generated (e.g., to a distributed ledger and/or internally). In embodiments, the smart contract may be configured with an event listener that listens for events associated with the forward contract and triggers actions based thereon. For example, an event listener may be configured to listen for a date, and when the date reaches the contract settlement date, the smart contract may initiate the transfer of funds from the buyer to the seller and/or the transfer of the assets to the buyer from the seller. Additionally or alternatively, an event listener may be configured to listen for a payment from the buyer to the seller and/or delivery of the assets from the seller to the buyer. If either of the conditions is not met, such as within a time period parameter defined within the smart contract, the smart contract may be configured to initiate a process that handles default scenarios (e.g., automatically transferring funds from the defaulting party to the counterparty from an account of the defaulting party).

It is appreciated that trading marketplaces may support smart contracts that govern other financial trading instruments, such as options, swaps (e.g., credit/default swaps, in-kind exchanges, and the like), futures, derivatives, and the like without departing from the scope of the disclosure. In embodiments, in generating smart contracts that govern options, a smart contract may be configured to listen for events related to the option. For example, if an option is triggered when the price of a particular commodity, financial instrument, or index reaches a triggering value, the option may be automatically executed. Similarly, the option may automatically vest (i.e., become exercisable) upon a trigger condition, which may include any of the triggers noted herein. In the example of a smart contract listening for a price trigger, an event listener of a smart contract that governs an option may be configured to receive data from a commodity or stock marketplace and to compare the current price of the commodity to the triggering value, such that when the current price reaches the triggering value, the smart contract may execute one or more actions that exercise the option in accordance with the agreed upon terms of the option contract.

In embodiments, the market orchestration system platform 20500 may cluster a set of smart contracts by attribute similarity. In embodiments, smart contract attributes may include smart contract types (e.g., smart legal contracts, decentralized autonomous organization (DAO) smart contracts, application logic contracts (ALCs), ancillary smart contracts and many others), programming language type (Solidity, Rust, JavaScript, Vyper, Yul, and many others), transaction types (e.g., payment of funds upon certain triggering events, imposing financial penalties if certain objective conditions are not satisfied, and many others), smart contract function types, parties or party types subject to the smart contracts, number of parties subject to the smart contracts, relevant chain(s) related to the smart contracts, assets or asset types subject to the smart contracts, asset volumes covered by the smart contracts, total monetary value of the smart contracts, pricing related to the smart contracts, events related to the smart contracts, conditions related to the smart contracts, smart contract timing attributes, smart contract statuses (e.g., pending, executed, abandoned, and the like), smart contract terms, likelihood of execution, transaction fees, off-chain resources (i.e., information or parameters from resources that are not on the blockchain), oracles, and many others.

In embodiments, the market orchestration system platform 20500 may leverage the artificial intelligence system to cluster a set of smart contracts by attribute similarity. In embodiments, an artificial intelligent services system 20243 receives an intelligence request and any required data to process the request from the market orchestration system platform 20500. In response to the request and the specific data, one or more implicated artificial intelligence system perform the intelligence task and output a clustering of the set of smart contracts by attribute similarity.

For example, the intelligent services 8800 may receive data from various sources described throughout this document and the documents incorporated by reference herein and may generate a set of feature vectors based on the received data. The intelligent services system 20243 may input the set of feature vectors into a machine-learned model (e.g., using a combination of simulation data and real-world data) to cluster a set of smart contracts by attribute similarity by a set of human experts and/or by the other systems or models. Data sources and feature vectors used for smart contract clustering may include marketplace smart contract data, asset data, user data, transaction data, as well as external data sources (such as publicly available smart contract data) and many others. Such artificial intelligence systems used for clustering, in the present example and other examples described herein, may include a recurrent neural network (including a gated recurrent neural network), a convolutional neural network, a combination of recurrent neural network and a convolutional neural network, or other types of neural network or combination or hybrid types of neural network described herein or in the documents incorporated by reference herein.

In embodiments, machine learning and/or artificial intelligence models may be trained using existing public facing smart contracts to determine clustering and high-level meta tags.

In embodiments, outliers within a cluster of smart contracts may be highlighted or otherwise presented to a user. For example, buy-side bond purchase smart contracts may be assigned to a cluster to reveal price outliers.

In embodiments, the market orchestration system platform 20500 may leverage the intelligent services system 20243 (such as artificial intelligence system, RPA module and/or NLP module 8824) to automatically convert discussions into a smart contract. In embodiments, discussions may include email discussions, instant messaging and/or chat discussions, text messaging discussions, video conferencing discussions, phone call discussions, and many others. For example, an agreement captured in a video conference to keep the video conference discussion confidential may be captured and applied to the video conference discussion as a wrapper.

In embodiments, the market orchestration system platform 20500 may provide visual representations of relevant terms and/or conditions from a set of smart contracts and/or proposed smart contracts. Such visual representations may be presented to the user via a set of digital twins, the user interface of an application, a wearable, an augmented reality headset, a virtual reality headset, and many others.

For example, a digital twin accessed by a trader (e.g., a trader digital twin, a digital twin of the trader's account, a digital twin of a marketplace, a digital twin of a set of smart contracts, or the like) may present visual representations of the relevant terms and/or conditions of a set of smart contracts related to buy-side asset purchases, such as smart contract duration, decision points, pricing, current position exposure, risk, liquidity, and the like. In embodiments, the digital twin may also present recommendations, such as for risk mitigation (e.g., hedging or insurance), termination, amendment, expansion, or the like. In embodiments, such recommendations may be represented visually via the digital twin.

In embodiments, the market orchestration system platform 20500 may execute simulations relating one or more terms and/or conditions from a set of smart contracts or proposed smart contracts and present such simulations and/or the results of such simulations to the user via a user interface.

In some embodiments, the market orchestration system platform 20500 may leverage the intelligent services system 20243 to provide data stories about relevant terms and/or conditions from a set of smart contracts and/or proposed smart contracts. Continuing the example, a machine learning and/or artificial intelligence system may generate an audiovisual data story based on the set of smart contracts and/or proposed smart contracts and output the generated audiovisual data story to the market orchestration system platform 20500. In embodiments, the market orchestration system platform 20500 may be configured to enable presentation of the data story to a user via a user interface, such as the user interface of a digital twin or the user interface of a digital wallet. In embodiments, the audiovisual data story may include the results of various simulations related to the set of smart contracts and/or proposed smart contracts.

In embodiments, the intelligent services system 20243 performs machine learning, artificial intelligence, intelligent order matching, counterparty discovery, counterparty intelligence, analytics tasks, and/or any other suitable tasks on behalf of the platform 20500. In embodiments, the intelligent services system 20243 includes a machine learning system that trains machine learned models that are used by the various systems of the platform 20500 to perform intelligence tasks, including robotic process automation, predictions and forecasts, classifications (including behavioral classifications, type determination and others), process control, monitoring of conditions, translation (such as language translation), natural language processing, prescriptive analytics, and the like. In embodiments, the platform 20500 includes an artificial intelligence system that performs various AI tasks, such as automated decision making, robotic process automation, and the like. In embodiments, the platform 20500 includes an analytics system that performs different analytics across marketplace data to identify insights related to the states of a marketplace, marketplace assets, traders, and the like. For example, in embodiments, the analytics system may analyze the performance data, condition data, sensor data, or the like with respect to a physical asset to determine whether the asset is in excellent condition, satisfactory condition, or in poor condition. In embodiments, the analytics system may perform the analytics in real-time as data is ingested from the various data sources to update one or more states of a marketplace asset. In embodiments, the intelligent services system 20243 includes a robotic process automation system that learns behaviors of respective users and automates one or more tasks on behalf of the users based on the learned behaviors. In some of these embodiments, the robotic process automation system may configure intelligent agents 20234 on behalf of a marketplace host, trader, broker, or the like. The robotic process automation system may configure machine-learned models and/or AI logic that operate to generate outputs, such as ones that govern actions or provide inputs to other systems, given a set of stimuli. In embodiments, the robotic process automation system receives training data sets of interactions by experts and configures the machine-learned models and/or AI logic based on the training data sets. In embodiments, the intelligent services system 20243 includes a natural language processing system that receives text/speech and determines a context of the text and/or generates text in response to a request to generate text. The intelligent services are discussed in greater detail throughout the disclosure and the documents incorporated herein by reference.

In embodiments, the intelligent services system 20243 performs machine learning, artificial intelligence, and analytics tasks on behalf of the platform 20500. In embodiments, the intelligent services system 20243 includes a machine learning system that trains machine learned models that are used by the various systems of the platform 20500 to perform some intelligence tasks, including robotic process automation, predictions, classifications, natural language processing, and the like. In embodiments, the platform 20500 includes an artificial intelligence system that performs various AI tasks, such as automated decision making, robotic process automation, and the like. In embodiments, the platform 20500 includes an analytics system that performs different analytics across data sources, such as enterprise data, to identify insights to various states of a marketplace. For example, in embodiments, the analytics system may analyze the financial data of an asset to determine whether the asset is financially stable, in a critical condition, or a desirable condition. In embodiments, the analytics system may perform the analytics in real-time as data is ingested from the various data sources to update one or more states of a market orchestration digital twin. In embodiments, the intelligent services system 20243 includes a robotic process automation system that learns behaviors of respective users and automates one or more tasks on behalf of the users based on the learned behaviors. In some of these embodiments, the robotic process automation system may configure expert agents on behalf of a marketplace and/or marketplace entities, such as users, a set of hosts, service providers, infrastructure providers, information technology providers, information providers, and others. The robotic process automation system may configure machine-learned models and/or AI logic that operate to generate outputs, such as ones that govern actions or provide inputs to other systems, given a set of stimuli. In embodiments, the robotic process automation system receives training data sets of interactions by experts and configures the machine-learned models and/or AI logic based on the training data sets. In embodiments, the intelligent services system 20243 includes a natural language processing system that receives text/speech and determines a context of the text and/or generates text in response to a request to generate text. The intelligent services are discussed in greater detail throughout the disclosure.

In some implementations, the intelligent services system 20243 performs machine learning and artificial intelligence related tasks on behalf of the market orchestration system platform 20500. In embodiments, the intelligent services system 20243 may train any suitable type of model, including but not limited to various types of neural networks, regression models, random forests, decision trees, Hidden Markov models, Bayesian models, and the like, including any of the expert and/or artificial intelligence examples described herein and, in the documents, incorporated by reference. In embodiments, the intelligent services system 20243 trains machine learned models using the output of simulations executed by the digital twin simulation system 20804 (FIG. 208) or other simulation system included in, integrated with, or linked to the platform 20500. In some of these embodiments, the outcomes of the simulations may be used to supplement training data collected from real-world environments and/or processes. In embodiments, the intelligent services system 20243 leverages machine learned models to make predictions, identifications, classifications, and recommendations; automate processes, perform marketplace configuration and control, and/or provide decision support relating to the marketplace and/or processes represented by respective digital twins.

For example, a set of machine-learned models may be used to predict the price of an asset at some future point in time. In embodiments, a "set" of machine-learned models may include a set with one member. In embodiments, a "set" of machine-learned models may include a set with multiple members. In embodiments, a "set" of machine-learned models may include hybrids of different types of models (e.g., hybrids of RNN and CNN). In this example, the intelligent services system 20243 may receive asset data, historical pricing data, discussion board data, and news data and may generate a set of feature vectors based on the received data. The intelligent services system 20243 may input the feature vector into the set of machine-learned models trained specifically for the asset (e.g., using a combination of simulation data and real-world data) to predict the price of the asset at a future point in time. In embodiments, the feature vector may include a set of predictions, such as ones made by human experts, by other systems, and/or by other models. Such artificial intelligence systems used for prediction (in this example and other examples described throughout this disclosure) may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to predict the probability of order execution for an order. In this example, the intelligent services system 20243 may receive order data, historical order data, and location data for the marketplace participant user device 20218 and may generate a set of feature vectors based on the received data. The intelligent services system 20243 may input the feature vectors into machine-learned models trained (e.g., using a combination of simulation data and real-world data) to predict the probability of order execution for an order, such as based on a training data set of outcomes. In embodiments, the system 20243 may include an input set of training data representing predictions or the probability of order execution by a set of human experts and/or by other systems or models.

In examples, a set of machine-learned models may be used to predict the profitability of a marketplace. In this example, the intelligent services system 20243 may receive marketplace configuration parameter data (e.g., asset type(s), fees, anonymity settings, and the like) and may generate a set of feature vectors based on the received data. The intelligent services system 20243 may input the feature vectors into machine-learned models trained (e.g., using a combination of simulation data and real-world data) to predict the profitability of a marketplace, such as based on a training data set of outcomes. In embodiments, the intelligent services system 20243 may include an input set of training data representing predictions related to marketplace profitability by a set of human experts and/or by other systems or models.

In yet other examples, a set of machine-learned models may be used to predict the execution speed for a marketplace at a given point in time. In this example, the intelligent services system 20243 may receive marketplace configuration parameter data and marketplace operational data and may generate feature vectors based on the received data. In embodiments, feature vectors may include other data, such as data characterizing information technology elements upon which execution speed may depend, including network path information (e.g., the type of fixed and/or wireless network, what networking protocols are used, the distance of physical layer paths, and the like); computational resource information (such as types and processing capabilities of servers and other data center resources, including, as applicable, availability of multi-core and/or multi-threaded processing, quantum computation and/or quantum algorithm execution, and the like, as well as edge computational capabilities that are available on premises involved in marketplace execution, in data centers that support cloud computing for marketplace execution and in local and telecommunications networks that support marketplace execution); data storage and retrieval information (such as input/output performance specifications for databases and other storage resources, caching performance capabilities, data location information (e.g., geo-location and federation of data resources), query performance information, and the like), and many others. The intelligent services system 20243 may input the feature vectors into machine-learned models trained (e.g., using a combination of simulation data and real-world data) to predict the execution speed for a marketplace at a given point in time from the point of view of a system that is at a given location (e.g., a geo-location, a network address, or the like). Prediction of execution speed may involve testing and simulation, such as using simulation methods and systems described herein, as well as in the documents incorporated by reference herein. This may include, in one non-limiting example, testing the latency, bandwidth, upload speed, download speed, round-trip speed, ping, or other network performance characteristics, such as by, optionally automatically, sending test signals that provide an indication of current network speed, execution speed, or the like.

In examples, a set of machine-learned models may be used to detect illicit and/or illegal items and/or services listed in a marketplace. In this example, the intelligent services system 20243 may receive asset listing data and may generate feature vectors based on the received data. The intelligent services system 20243 may input the feature vectors into machine-learned models trained (e.g., using a combination of simulation data and real-world data) to detect illicit and/or illegal items and/or services listed in the marketplace. In embodiments, detection of illicit and/or illegal items may involve a set of distinct models that are respectively trained based on training data sets and/or feature vector inputs that are specific to jurisdictional factors, including laws or regulations (e.g., training with awareness of legality), cultural factors (e.g., where whether the item is considered illicit varies based on cultural norms), religious factors (e.g., training the model with awareness of proscribed items), and the like. For example, a model may be trained to detect whether an item is kosher, whether it satisfies other cultural and/or religious requirements, or the like. In embodiments, training may include providing, such as through human experts, information about alternative terminology, or the like, that sellers or other users may employ to offer illegal or illicit items, such as code words, euphemisms, or the like. In embodiments, a model may be trained to provide a word cloud or cluster of words or other features, such as to facilitate recognition of illegal or illicit items and/or recognition of words, images, or other elements used to characterize them. As one non-limiting example, a self-organizing map (SOM) may be employed to generate a mapping of entities, such as mapping entities, classes, objects, workflows, or the like to jurisdictions, to topics, to each other, or the like.

In yet other examples, a set of machine-learned models may be used to detect trading patterns of a trader in a marketplace. In this example, the intelligent services system 20243 may receive trader data and order data and may generate feature vectors based on the received data. The intelligent services system 20243 may input the feature vectors into machine-learned models trained (e.g., using a combination of simulation data and real-world data) to detect trading patterns for a particular trader in the marketplace. In embodiments, trading patterns may be linked to strategies, such that the model may be used to determine a set of governing strategies, heuristics, models, rules, or other governing principles (collectively referred to for convenience as "strategies") of a trader or other counterparty to a transaction. Thus, a machine-learned model may take various feature vectors related to marketplace activities and output a determination of a strategy of a party, such as a user or a counterparty. Such a determination may facilitate identification and optionally automated recommendation to a user of resources, such as data resources, models, predictions, and the like, that are consistent with and/or that support or enable the defined strategy. In other embodiments, such a determination may facilitate identification and optionally automated recommendations to a counterparty user, such as to assist the counterparty in identifying complementary strategies (e.g., where two parties are seeking opposite sides of the same type of trade) and/or competitive strategies (e.g., where the strategy of a counterparty makes the counterparty vulnerable to trading strategies). Models may be trained to recognize various strategies, such as arbitrage strategies (e.g., where a counterparty's strategy is likely to over- or under-value an asset class in a certain set of situations), squeeze strategies (such as a short squeeze where a counterparty has taken a large "short" position anticipating that an asset is overvalued, where a higher volume of orders that increase prices force the counterparty to abandon the short position due to growing risk), market cornering strategies, and the like. Feature vectors that may be used to train machine-learning models to identify trading patterns and strategies may include trade sizes, sequences (e.g., combinations of buy and sell orders in given sequences), position sizes (including short and long positions of assets, options, futures, derivatives and the like), trading volume metrics, relative sizes of positions (e.g., share of total market positions), market metrics (e.g., overall P/E ratios), external data (e.g., relating to general economic conditions, weather, geopolitical factors, and the like), and many others. In embodiments, automated, machine-learned strategy recognition enables further automation (including by robotic process automation, such as trained on strategic decisions of human experts) of marketplace strategy, including automated recommendation of trades and automated recommendation of complementary and competitive strategies. This may be referred to as a counterparty strategy engine, such term encompassing various capabilities by which the platform 20500 may employ machine learning and/or other intelligence capabilities to facilitate complementary and/or competitive trading strategies based on understanding the patterns and strategies of counterparties. Trading strategies that may be generated, detected, managed, or countered using artificial intelligence, such as machine-learned models described herein, may include a wide variety of strategies, including, without limitation: (a) buy and hold, or "fundamental" strategies (where input data sources and resulting feature vectors may be sought that relate to long-term fundamental performance, such as data sources relating to trends in asset class values, asset-related income streams (e.g., rents, royalties, interest rates, and the like), pricing and related metrics (such as P/E ratios), cost accounting information, tax information, exchange rate information, macroeconomic information (such as inflation information, unemployment information, gross domestic product information), and the like); (b) long/short equity strategies, such as ones that tranche securities into long and short buckets based on calculated alpha factors, with long positions taken on relatively favorable alpha assets or asset classes and short positions taken on relatively unfavorable alpha assets or asset classes (where input data sources and feature vectors include many of the same factors used for buy and hold strategies, with a particular interest in indicators of relative performance among securities or other assets, such as relative P/E ratios, relative historical asset class performance, or the like); (c) asset allocation strategies where parties allocate positions in portfolios among asset classes based on relative risk/return ratios that are suitable for a party; (d) intertemporal portfolio choice strategies involving bet (e.g. trade) sizing that is configured according to a defined proportion of wealth, such as using the Kelly criterion (where the bet size is calculated by maximizing the expected value of the logarithm of wealth), such as where data sources and feature vectors may involve information indicating the trades made by an identified party and information indicating the parties total wealth or capitalization; (e) pairs trading strategies where similar stocks are paired and a short position is taken on the top (potentially overpriced) asset and a long position is taken on the bottom (potentially underpriced) asset (which may optionally involve pairing similar stocks and using a linear combination (or other combination) of their price to generate a stationary time-series, computing a set of scores, such as z-scores, for the stationary signal and trading on the spread assuming reversion to the mean) where input data sources and feature vectors may include trading data that indicates trades of similar size and timing in pairs of similar assets; (f) swing trading strategies seeking to take advantage of volatility, where input data sources and feature vectors may relate to pricing information and patterns, as well as factors that may influence volatility (such as geopolitical data, social data, macroeconomic data, and the like); (g) scalping strategies (such as making very large numbers of trades during a trading session in order to seek to aggregate small profits from each trade based on a spread between the bid and the ask price for an asset) where input data sources and feature vectors may relate to trade volumes and sizes and the size of the average bid/ask spread, as well as many of the other sources and features noted above; (h) day trading strategies involving buying and selling within the same trading session, thereby closing out positions during periods when the market is not operating, which may involve data sources and feature vectors that indicate complementary pairs (e.g., a buy and a sell) of trades of the same quantity of the same asset during a trading session, among others; (i) news-based or information-based trading strategies involving rapidly anticipating the impact of news events or other emerging information on asset prices, which may involve data sources and feature vectors that help predict or anticipate news (e.g., using predictive models), that help identify relevant events in real-time (such as Internet of Things sources, crowdsources, social data sites, websites, news feeds, and many others) and data sources that indicate historical trends, such as reactions to similar news or events in past trading involving the same or similar asset classes; (j) market timing strategies, including signal-based trading strategies, momentum trading strategies, and the like, involving timing the purchase or sale of an asset class based on market signals, which may use a wide variety of sources used by signals providers to produce aggregate forecasts of market signals as well as other information that indicates patterns of reaction of markets to new information and events; (k) social trading strategies, such as involving trading based on behavioral models of counterparty trading, which may involve data sources and feature vectors that reflect trading behavior, such as trading volume data, price pattern data, and the like, in response to market conditions, events and stimuli, including many of the data sources and feature vectors mentioned herein; (l) front-running strategies (involving detecting indicators of trading intent by a counterparty and rapidly executing a trade before the intent is realized in the form of an actual trade by the counterparty); (m) chart-based or pattern-based strategies, where trading is based on analysis of charts, such as trends in pricing of trades over a session or series of sessions, such as ones that seek to anticipate future movements in prices based on patterns of past movement (e.g., anticipating an upward surge after a "cup with a handle" price pattern), which are typically based on some underlying behavioral model of aggregate trading behavior of a set of traders in a marketplace and which may use data source or feature vectors that indicate patterns of market behavior and market outcomes, such as trend charts and other visual information on patterns; (n) genetic programming, deep learning, or other computer science-based strategies (such as involving introducing a degree of random or non-random variation into a trading algorithm or model, such as a variation of data source, feature vector, feedback source, weighting, type of neural network, or the like used in an artificial intelligence system, variation of trading patterns (size, timing, price, volume), variation in asset class, variation of strategy, or the like), such as where data sources of feature vectors may be identified that relate to patterns, trends or changes in any of the above within marketplace trading data; (o) automated or algorithmic trading strategies (which may be used to implement any of the foregoing and other strategies), where marketplace trading data sources may be used to identify trading patterns that indicate very rapid execution or other patterns that are markers of algorithmic execution; (p) various hybrids and combinations of the foregoing; and various other trading strategies used in any of a wide range of asset classes and marketplaces described herein. Such artificial intelligence systems used for detection or identification (in this example and other examples described throughout this disclosure) may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In yet other examples, a set of machine-learned models may be used to detect an opportunity for a new marketplace. For example, the intelligent services system 20243 may receive data from various sources described throughout this document and the documents incorporated by reference herein and may generate a set of feature vectors based on the received data. The intelligent services system 20243 may input the set of feature vectors into machine-learned models trained (e.g., using a combination of simulation data and real-world data) to detect an opportunity for a new marketplace. Data sources used to produce the set of feature vectors may include, for example, discussion boards (such as involving chats, comment threads or the like about deals, trades, asset types, streams of value, or the like that may be organized into a marketplace), social media sites (such as involving posts or threads involving assets that can be traded, deals, or the like), websites (such as announcing products, services, offerings, events, or the like), and others. As one non-limiting example, content from a set of websites and social media sites involving events (such as ones hosted by event organizers, event participants, fans, followers, and others) may be fed to a machine-learned model that may be trained to operate on the feature vectors, such as using a neural network (such as an RNN, CNN, SOM or hybrid, among many other options), to output a candidate set of events that may be suitable candidates for a contingent forward market for rights to the event. The model may be trained, for example, to identify events that are likely to be very popular (such as involving popular talent, popular teams, or the like) and to identify cases in which some aspect of the event remains contingent, such as timing, location, actual participants, and the like, meaning that a contingency can be set for rights (e.g., attendance rights, accommodation rights, transportation rights, and many others) in the forward market. Output from the model can thus be used as a candidate set for the contingent forward market operator. In examples, product websites content may be fed to the model, which may be trained to identify new product or service offerings relevant to a particular cohort of buyers, which may be automatically grouped by the model (or another model) into a cohort-targeted marketplace of similar buyers.

In examples, a set of machine-learned models may be used to identify optimal trading opportunities. For example, the intelligent services system 20243 may receive data from various sources described throughout this document and the documents incorporated by reference herein and may generate a set of feature vectors based on the received data. The intelligent services system 20243 may input the set of feature vectors into machine-learned models trained (e.g., using a combination of simulation data and real-world data) to identify optimal trading opportunities, such as based on a training data set of outcomes. In embodiments, the intelligent services system 20243 may include an input set of training data representing identifications related to optimal marketplace trading opportunities by a set of human experts and/or by other systems or models. Data sources that may be used to produce feature vectors may include, for example, time of day, location of price, moving averages, performance of correlated assets, performance of indexes, discussion boards (such as involving chats, comment threads or the like about deals, trades, trends, or the like), websites (such as announcing products, services, offerings, events, or the like), and many others.

In examples, a set of machine-learned models may be used to detect fraudulent asset listings. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to detect fraudulent asset listings, such as based on a training data set of outcomes. In embodiments, the intelligent services system 20243 may include an input set of training data representing detection related to fraudulent listings by a set of human experts and/or by other systems or models. In embodiments, training may include providing information related to identical and/or similar asset listings that may have been fraudulently duplicated. In embodiments, a model may be trained to provide a word cloud or cluster of words or other features, such as to facilitate recognition of fraudulent listings and/or recognition of words, images, or other elements used to characterize them. Data sources that may be used to produce feature vectors may include, for example, websites (such as websites listing assets, products, services, offerings, or the like), pricing data (such as unusually low pricing), asset description data (such as overly generic asset descriptions or illiterate asset descriptions), and many others.

In examples, a set of machine-learned models may be used to detect market behavior for an asset. For example, the intelligent services system 20243 may receive data from various sources described throughout this document and the documents incorporated by reference herein and may generate a set of feature vectors based on the received data. The intelligent services system 20243 may input the feature vector into machine-learned models trained (e.g., using a combination of simulation data and real-world data) to detect market behavior around a particular asset, such as based on a training data set of outcomes. In embodiments, the intelligent services system 20243 may include an input set of training data representing detection related to market behavior by a set of human experts and/or by other systems or models. Data sources that may be used to produce feature vectors may include trade sizes, sequences (e.g., combinations of buy and sell orders in given sequences), position sizes (including short and long positions of assets, options, futures, derivatives, and the like), trading volume metrics, relative sizes of positions (e.g., share of total market positions), market metrics (e.g., overall P/E ratios), and many others.

In examples, machine-learned models may be used to identify trending assets. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to identify trending assets, such as based on a training data set of outcomes. In embodiments, the intelligent services system 20243 may include an input set of training data representing detection related to trending assets by a set of human experts and/or by other systems or models. Data sources used to produce the set of feature vectors may include, for example, discussion boards (such as involving chats, comment threads involving assets, or the like), social media sites (such as involving posts or threads involving assets or the like), websites (such as news involving assets or the like), and others. In examples, a set of machine-learned models may be used to determine market sentiment for a particular asset. For example, the intelligent services system 20243 may receive data from various sources described throughout this document and the documents incorporated by reference herein and may generate a set of feature vectors based on the received data. The intelligent services system 20243 may input the feature vector into machine-learned models trained (e.g., using a combination of simulation data and real-world data) to determine market sentiment for the asset, such as based on a training data set of outcomes. In embodiments, the intelligent services system 20243 may include an input set of training data representing determinations related to market sentiment by a set of human experts and/or by other systems or models. Data sources used to produce the set of feature vectors may include, for example, discussion boards (such as involving chats, comment threads involving assets or the like), social media sites (such as involving posts or threads involving assets or the like), external (such as news involving assets or the like), trading data, volume data, upside/downside volume ratio data, trader data (scanning many markets to find parties who have ever traded in the asset class or similar asset classes), data indicating focus (e.g., websites of capital allocators indicating areas of focus), data indicating strategies (indicators of the general strategy of the trader, such as "buy and hold," "arbitrage," "day trading", and many others, which can be used to recruit parties who favor the behavior of the asset class (e.g., high within-session volatility for day traders versus long-term fundamental value aggregation (e.g., growing income streams) for buy-and-hold)), trading news data, survey data, open interest data (e.g., total number of futures contracts or options that are held by traders), put-call ratio data, volatility index (VIX) data, commitment of traders (COT) data, high-low index data, crowdsourced data, short-term trading index (TRIN) data, advance/decline ratio data, NYSE high/low ratio data, NYSE bullish percent index data, data collected by IoT systems (e.g., smart home IoT devices, workplace IoT devices, and the like) to monitor a set of entities in a set of environments, and many others.

Such artificial intelligence systems used for decision-making or other determinations (in this example and other examples described throughout this disclosure) may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to identify counterparties with complementary trading positions and/or strategies. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to identify counterparties with complementary trading positions and/or strategies, such as based on a training data set of outcomes. In embodiments, the intelligent services system 20243 may include an input set of training data representing identifications related to counterparties with complementary trading positions and/or strategies by a set of human experts and/or by other systems or models. In embodiments, automated, machine-learned counterparty recognition enables further automation (including by robotic process automation, such as trained on strategic decisions of human experts) of marketplace strategy. The counterparty strategy engine may employ machine learning and/or other intelligence capabilities to facilitate counterparty discovery based on understanding the patterns and strategies of counterparties. Data sources used to produce the set of feature vectors may include, for example, trading data (scanning many markets to find parties who have ever traded in the asset class or similar asset classes), data indicating strategies (indicators of the general strategy of the trader, such as "buy and hold," "arbitrage," "day trading"), trader profile data, and many others.

In examples, a set of machine-learned models may be used to detect potential marketplace participants for marketplace recruitment purposes. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to detect potential marketplace participants, such as based on a training data set of outcomes. In embodiments, the intelligent services system 20243 may include an input set of training data representing detection related to potential marketplace participants by a set of human experts and/or by other systems or models. Data sources used to produce the set of feature vectors may include, for example, trading data (scanning many markets to find parties who have ever traded in the asset class or similar asset classes), data indicating focus (e.g., websites of capital allocators indicating areas of focus), data indicating strategies (indicators of the general strategy of the trader, such as "buy and hold," "arbitrage," "day trading", and many others, which can be used to recruit parties who favor the behavior of the asset class (e.g., high within-session volatility for day traders versus long-term fundamental value aggregation (e.g., growing income streams) for buy-and-hold)), and many others.

In examples, a set of machine-learned models may be used to provide decision support related to configuration of a marketplace. In embodiments, the decision support may be provided by a marketplace configuration decision support platform. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to provide decision support related to configuration of a marketplace, such as based on a training data set of outcomes. In embodiments, the intelligent services system 20243 may include an input set of training data representing decision support related to marketplace configuration by a set of human experts and/or by other systems or models. In some embodiments, the decision support may relate to guidance on marketplace anonymity settings, fee settings, transaction type (e.g., buy-sell, auction, reverse auction, or the like), listing requirements, supported trading types, and the like. In the present example, the intelligent services system 20243, which may receive asset data (optionally including asset demand data, supply data, cost data, volatility data, pricing pattern data, trade size data, trade volume data, geographic trading data, trading party profile data, previous close data, open data, low data, high data, price data, change data, change percent data, 52 week low data, 52 week high data, shares outstanding data, market capitalization data, price-to-earnings (P/E) data, beta data, asset/instrument type data, industry data, employee data, last trade time data, asset location data, asset condition data, asset performance data, asset dimension data, asset brand data, asset material data, and/or many other types of asset-related data), marketplace profitability data, laws or regulations (e.g., training with awareness of legality), and many others.

In some examples, the marketplace configuration-related decision support may relate to guidance on marketplace anonymity settings, fee settings, supported transaction types (e.g., buy-sell, auction, reverse auction, or the like), asset listing requirements, whether futures trading mechanisms are enabled, whether price arbitrage mechanisms are enabled, whether derivatives trading mechanisms are enabled, supported trading types, selection of data storage and use policies, and many others described throughout this document and documents incorporated by reference herein.

In examples, a set of machine-learned models may be used to provide decision support related to the pricing of one or more assets. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to provide decision support related to the pricing of one or more assets, such as based on a training data set of outcomes. In embodiments, the intelligent services system 20243 may include an input set of training data representing decision support related to asset pricing by a set of human experts and/or by other systems or models. Data sources used to produce the set of feature vectors, may include, but are not limited to, asset data (optionally including asset demand data, supply data, cost data, volatility data, pricing pattern data, trade size data, trade volume data, geographic trading data, trading party profile data, and/or many other types of asset-related data), discussion boards (such as involving chats, comment threads involving assets or the like), social media sites (such as involving posts or threads involving assets or the like), external (such as news involving assets or the like), and others.

In examples, a set of machine-learned models may be used to provide decision support related to order request parameters (e.g., pricing, quantity, action type, and the like). For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to provide decision support related to order request parameters, such as based on a training data set of outcomes. In embodiments, the system 20243 may include an input set of training data representing decision support related to order request parameters by a set of human experts and/or by other systems or models. Data sources used to produce the set of feature vectors, may include, but are not limited to, pricing data, profitability data, operational data, product or service performance data, liability data, party performance data, market data (e.g., price trends, volatility, and others), and many others.

In examples, a set of machine-learned models may be used to provide decision support related to cancelling orders. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to provide decision support related to order cancellation, such as based on a training data set of outcomes. In embodiments, the intelligent services system 20243 may include an input set of training data representing decision support related to cancelling orders by a set of human experts and/or by other systems or models. Data sources used to produce the set of feature vectors, may include, but are not limited to, asset data (optionally including asset demand data, supply data, cost data, volatility data, pricing pattern data, trade size data, trade volume data, geographic trading data, trading party profile data, and/or many other types of asset-related data), external data (such as news involving assets or the like), and others.

In examples, a set of machine-learned models may be used to provide decision support related to setting smart contract parameters (e.g., pricing, quantity, delivery, and the like). Taking the example further, for a smart contract related to replacement part for a machine, the intelligent services system 20243 may receive historical and current data from or about the machine and/or a facility in which it is located and may generate a set of feature vectors based on the received data. The intelligent services system 20243 may input the set of feature vectors into a machine-learned model trained (e.g., using a combination of simulation data and real-world data) to provide decision support related to setting smart contract parameters. In embodiments, a model or set of models may be trained by an expert in the replacement parts and service marketplace to configure appropriate price, service, and delivery terms and conditions for replacement of the part for the machine, based on the historical and current data. Smart contract configuration may involve sets of feature vectors using or derived from historical contract performance data, including pricing data, profitability data, operational data, product or service performance data, liability data, data indicative of failure rates (e.g., product faults, service failures, delivery failures, and many others), party performance data, market data (e.g., price trends, volatility, and others), and many others.

In yet other examples, a set of machine-learned models may be used to determine regulatory compliance of a marketplace, a trader, a broker, a trade, an asset listing, a holder of inside information, or the like. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to determine regulatory compliance. As one non-limiting example, regulatory compliance may include compliance with regulations that prohibit holders of inside information from signaling the market in advance of trading activities to their benefit. In embodiments, relating to such an example, a machine-learned model may parse large bodies of material, such as press releases, podcasts, interviews, and the like, such as to find instances of signaling. In embodiments, automated identification of similar content, and respective timing, among public, or semi-public communications, trading activities, and content of securities filings may be performed to identify suspicious sequences, such as where a trade was followed by a public statement that impacted the value of the trade. In examples, the machine-learned model may parse trades, and trade timing, along with evidence of party relatedness (e.g., social media connections) to find indications of insider trading where an inside party has tipped an outside party, such as a family member, a business associate, a colleague, or the like. Embodiments extend to policy compliance, such as for marketplaces where insider trading is not prohibited but would be frowned upon if discovered to be done, such as where parties are rated based on the extent of their inside trading activity.

In yet other examples, a set of machine-learned models may be used to generate a trading strategy. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to generate a trading strategy. Generation of a trading strategy may be trained on outcomes, including by use of various metrics that indicate trading strategy performance, optionally including risk-adjusted strategy performance, such as Sharpe ratios, multiples on invested capital, investment rates of return (IRRs), cost-adjusted return metrics, benchmark comparisons (e.g., benchmarking against an index fund), and many others.

Trading strategies that may be generated, detected, managed, or countered using artificial intelligence, such as machine-learned models described herein, may include a wide variety of strategies, including, without limitation: (a) buy and hold, or "fundamental" strategies (where input data sources and resulting feature vectors may be sought that relate to long-term fundamental performance, such as data sources relating to trends in asset class values, asset-related income streams (e.g., rents, royalties, interest rates, and the like), pricing and related metrics (such as P/E ratios), cost accounting information, tax information, exchange rate information, macroeconomic information (such as inflation information, unemployment information, gross domestic product information), and the like); (b) long/short equity strategies, such as ones that tranche securities into long and short buckets based on calculated alpha factors, with long positions taken on relatively favorable alpha assets or asset classes and short positions taken on relatively unfavorable alpha assets or asset classes (where input data sources and feature vectors include many of the same factors used for buy and hold strategies, with a particular interest in indicators of relative performance among securities or other assets, such as relative P/E ratios, relative historical asset class performance, or the like); (c) asset allocation strategies where parties allocate positions in portfolios among asset classes based on relative risk/return ratios that are suitable for a party; (d) intertemporal portfolio choice strategies involving bet (e.g. trade) sizing that is configured according to a defined proportion of wealth, such as using the Kelly criterion (where the bet size is calculated by maximizing the expected value of the logarithm of wealth), such as where data sources and feature vectors may involve information indicating the trades made by an identified party and information indicating the parties total wealth or capitalization; (e) In pairs trading strategies where similar stocks are paired and a short position is taken on the top (potentially overpriced) asset and a long position is taken on the bottom (potentially underpriced) asset (which may optionally involve pairing similar stocks and using a linear combination (or other combination) of their price to generate a stationary time-series, computing a set of scores, such as z-scores, for the stationary signal and trading on the spread assuming reversion to the mean) where input data sources and feature vectors may include trading data that indicates trades of similar size and timing in pairs of similar assets; (f) swing trading strategies seeking to take advantage of volatility, where input data sources and feature vectors may relate to pricing information and patterns, as well as factors that may influence volatility (such as geopolitical data, social data, macroeconomic data, and the like); (g) scalping strategies (such as making very large numbers of trades during a trading session in order to seek to aggregate small profits from each trade based on a spread between the bid and the ask price for an asset) where input data sources and feature vectors may relate to trade volumes and sizes and the size of the average bid/ask spread, as well as many of the other sources and features noted above; (h) day trading strategies involving buying and selling within the same trading session, thereby closing out positions during periods when the market is not operating, which may involve data sources and feature vectors that indicate complementary pairs (e.g., a buy and a sell) of trades of the same quantity of the same asset during a trading session, among others; (i) news-based or information-based trading strategies involving rapidly anticipating the impact of news events or other emerging information on asset prices, which may involve data sources and feature vectors that help predict or anticipate news (e.g., using predictive models), that help identify relevant events in real-time (such as Internet of Things sources, crowdsources, social data sites, websites, news feeds and many others) and data sources that indicate historical trends, such as reactions to similar news or events in past trading involving the same or similar asset classes; (j) market timing strategies, including signal-based trading strategies, momentum trading strategies and the like, involving timing the purchase or sale of an asset class based on market signals, which may use a wide variety of sources used by signals providers to produce aggregate forecasts of market signals, as well as other information that indicates patterns of reaction of markets to new information and events; (k) social trading strategies, such as involving trading based on behavioral models of counterparty trading, which may involve data sources and feature vectors that reflect trading behavior, such as trading volume data, price pattern data, and the like, in response to market conditions, events and stimuli, including many of the data sources and feature vectors mentioned herein; (l) front-running strategies (involving detecting indicators of trading intent by a counterparty and rapidly executing a trade before the intent is realized in the form of an actual trade by the counterparty); (m) chart-based or pattern-based strategies, where trading is based on analysis of charts, such as trends in pricing of trades over a session or series of sessions, such as ones that seek to anticipate future movements in prices based on patterns of past movement (e.g., anticipating an upward surge after a "cup with a handle" price pattern), which are typically based on some underlying behavioral model of aggregate trading behavior of a set of traders in a marketplace and which may use data source or feature vectors that indicate patterns of market behavior and market outcomes, such as trend charts and other visual information on patterns; (n) genetic programming, deep learning, or other computer science-based strategies (such as involving introducing a degree of random or non-random variation into a trading algorithm or model, such as a variation of data source, feature vector, feedback source, weighting, type of neural network, or the like used in an artificial intelligence system, variation of trading patterns (size, timing, price, volume), variation in asset class, variation of strategy, or the like), such as where data sources of feature vectors may be identified that relate to patterns, trends or changes in any of the above within marketplace trading data; (o) automated or algorithmic trading strategies (which may be used to implement any of the foregoing and other strategies), where marketplace trading data sources may be used to identify trading patterns that indicate very rapid execution or other patterns that are markers of algorithmic execution; (p)

various hybrids and combinations of the foregoing; and various other trading strategies used in any of a wide range of asset classes and marketplaces described herein.

In yet other examples, a set of machine-learned models may be used to detect a trading strategy, such as of a set of counterparties. The intelligent services system 20243 may receive data from various sources and may generate a set of feature vectors based on the received data. The intelligent services system 20243 may input the set of feature vectors into a machine-learned model trained to detect the trading strategy and to generate an output that classifies the trading strategy. In embodiments, the model may be trained on a training data set wherein expert traders classify trading strategies based on the data sources and/or upon outcomes (such as outcomes of counterstrategies that were selected based on the classifications and/or upon outcomes where one or more parties validated the accuracy of the classification). In embodiments, the model may be generated by deep learning. In embodiments, the model may be supervised, unsupervised, or semi-supervised. In embodiments, the model may use a recurrent neural network, optionally a gated recurrent neural network that provides improved performance as a result of placing diminishing weight on aging data and that mitigates compounding error problems. In embodiments, the model may employ a convolutional neural network (alone or in combination with another type of neural network, such as a recurrent neural network), such as where images of trading patterns (e.g., price patterns, volatility patterns, volume patterns and the like) are provided as input data sources to the model. Once a trading strategy is classified, a further machine-learned model as previously described may generate an appropriate trading strategy that is a suitable counterstrategy to the detected strategy.

In yet other examples, a set of machine-learned models may be used to select a trading strategy from a set of trading strategies, including any of the strategies described herein and/or in the documents incorporated herein by reference. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to select a trading strategy from a set of trading strategies, such as based on a training data set of outcomes. In embodiments, the intelligent services system 20243 may include an input set of training data representing decision support related to selecting trading strategies by a set of human experts and/or by other systems or models. Selection of a trading strategy may be trained on outcomes, including by use of various metrics that indicate trading strategy performance, optionally including risk-adjusted strategy performance, such as Sharpe ratios, multiples on invested capital, investment rates of return (IRRs), cost-adjusted return metrics, benchmark comparisons (e.g., benchmarking against an index fund), and many others. Data sources and feature vectors used for management may include marketplace data of the many types described herein as well as external data sources that may assist with prediction of trading behavior and marketplace patterns.

In yet other examples, a set of machine-learned models may be used to manage a trading strategy, including any of the strategies described herein and/or in the documents incorporated herein by reference. For example, the intelligent services system 20243 may receive data from various sources described throughout this document and the documents incorporated by reference herein and may generate a set of feature vectors based on the received data. The intelligent services system 20243 may input the set of feature vectors into a machine-learned model that is trained (e.g., using a combination of simulation data and real-world data) to manage the trading strategy. The model performing management of the trading strategy may be trained based on a training set of management decisions by a set of experts that manage the strategies, and in embodiments, may employ robotic process automation by training on a set of inputs by experts in a management interface that manages the trading strategy. The model may be a deep learning model, a supervised model, an unsupervised model and/or a semi-supervised model and may employ any of the artificial intelligence techniques and systems described herein and/or in the documents incorporated by reference. In embodiments, the management model is trained on outcomes/feedback, such as one or more performance metrics described herein, such as a Sharpe ratio or other metric of model performance. Data sources and feature vectors used for management may include marketplace data of the many types described herein as well as external data sources that may assist with prediction of trading behavior and marketplace patterns. A strategy management model may be configured to implement a set of rules or policies, such as ones that require halting of trading in extreme circumstances, ones that shift to alternate strategies based on contextual or market conditions, or the like. For example, a set of rules may provide for a primary strategy and a set of contingent strategies that are triggered upon determination of a set of triggers, whereby the management model automatically shifts to the contingent strategy upon detection of the trigger. For example, a buy and hold strategy may be configured to shift to an active trading (e.g., selling, or shorting) strategy upon detection that the aggregate price/earnings ratio of a marketplace exceeds a defined value (such as suggesting that the entire asset class is overvalued). As another example, a day trading strategy may be configured to shift automatically to a long/short strategy if in-session price volatility is detected to be below a defined threshold metric, implying that day trading is unlikely to be profitable on a cost- and risk-adjusted basis due to trading costs. In embodiments, a set of trading strategies may be structured in a hierarchy, a flow diagram, a graph (optionally a directed acyclic graph), or the like, which may be configured in a data schema (optionally stored in a graph database or similar data resource) that can be parsed by the machine-learned strategy management model to determine a sequence of trading strategies in response to determination of triggers. In embodiments, the data schema capturing the set of trading strategies may include triggers (states, conditions, thresholds, and the like) for triggering shifts in trading strategy, as well as the rules, configuration parameters, and other data and metadata needed to configure the model for management of each strategy or set or set of strategies.

In examples, a set of machine-learned models may be used to categorize or classify traders. For example, the intelligent services system 20243 may receive data from various sources described throughout this document and the documents incorporated by reference herein and may generate a set of feature vectors based on the received data. The intelligent services system 20243 may input the set of feature vectors into a machine-learned model trained (e.g., using a combination of simulation data and real-world data) to categorize traders, such as based on a training data set of outcomes. In embodiments, the intelligent services system 20243 may include an input set of training data representing categorizations or classifications of traders by a set of human experts and/or by other systems or models. Data sources and feature vectors used for categorization or classification of traders may include marketplace data of the many types described herein, trader profile data, as well as external data sources (such as from social media content originating from or relating to traders or discussion board content originating from or relating to traders) that may assist with classification or categorization of traders. Such artificial intelligence systems used for classification, in the present example and other examples described herein, may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In yet other examples, a set of machine-learned models may be used to classify or categorize assets. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to categorize assets, such as based on a training data set of outcomes. In embodiments, the intelligent services system 20243 may include an input set of training data representing categorizations or classifications of assets by a set of human experts and/or by other systems or models. Data sources and feature vectors used for categorization or classification of assets may include from historical asset performance data, including pricing data, profitability data, operational data, product or service performance data, liability data, data indicative of failure rates (e.g., product faults, service failures, delivery failures, and many others), party performance data, market data (e.g., price trends, volatility, and others), asset data (including asset descriptions, asset profiles, content associated with assets (including images, video, and audio)), as well as external data sources (such as from websites related to assets) that may assist with classification or categorization of assets, and many others.

In examples, a set of machine-learned models may be used to automatically configure a marketplace. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to automatically configure a marketplace, such as based on a training data set of outcomes. In embodiments, the intelligent services system 20243 may include an input set of training data representing marketplace configurations by a set of human experts and/or by other systems or models. Data sources and feature vectors used for configuration of marketplaces may include asset data (optionally including asset demand data, supply data, cost data, volatility data, pricing pattern data, trade size data, trade volume data, geographic trading data, trading party profile data, and/or many other types of asset-related data), marketplace profitability data, marketplace efficiency data, latency data, as well as external data sources (such as from laws or regulations) that may assist with marketplace configuration. Such artificial intelligence systems used for configuration, in the present example and other examples described herein, may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to optimize marketplace efficiency. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to optimize the efficiency of a marketplace, such as based on a training data set of outcomes. In embodiments, the intelligent services system 20243 may include an input set of training data representing marketplace efficiency optimization by a set of human experts and/or by other systems or models. Data sources and feature vectors used for optimization of marketplace efficiency may include marketplace data of the many types described herein (optionally including transaction matching speed data) that may assist with marketplace efficiency optimization. Such artificial intelligence systems used for optimization, in the present example and other examples described herein, may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to optimize marketplace profitability. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to optimize the profitability of the marketplace, such as based on a training data set of outcomes. In embodiments, the intelligent services system 20243 may include an input set of training data representing marketplace profitability optimization by a set of human experts and/or by other systems or models. Data sources and feature vectors used for optimization of marketplace profitability may include marketplace data of the many types described herein (optionally including trading data, commission data, or fees data) that may assist with marketplace profitability optimization.

In yet other examples, a set of machine-learned models may be used to automate trading activities. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to automate trading activities, such as based on a training data set of outcomes. In embodiments, the intelligent services system 20243 may include an input set of training data representing trading activities by a set of human experts and/or by other systems or models. Data sources used to produce the set of feature vectors, may include, but are not limited to, asset data (optionally including asset demand data, supply data, cost data, volatility data, pricing pattern data, trade size data, trade volume data, geographic trading data, trading party profile data, and/or many other types of asset-related data), discussion boards (such as involving chats, comment threads involving assets, or the like), social media sites (such as involving posts or threads involving assets or the like), external (such as news involving assets or the like), and others. Such artificial intelligence systems used for automation, in the present example and other examples described herein, may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to determine a counterparty's willingness to trade. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to determine a counterparty's willingness to enter a trade, such as based on a training data set of outcomes. In embodiments, the intelligent services system 20243 may include an input set of training data representing willingness to trade by a set of human experts and/or by other systems or models. Data sources and feature vectors used for determining a counterparty's willingness to trade may include trader profile data, historical trading data for the trader, external data (such as social media data or discussion board data relating to the trader/counterparty), or marketplace data of the many types described herein that may assist with determining a counterparty's willingness to enter a trade.

In examples, a set of machine-learned models may be used to generate a fairness score for a trade. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to generate a fairness score for a trade, such as based on a training data set of outcomes. In embodiments, the intelligent services system 20243 may include an input set of training data representing fairness scores by a set of human experts and/or by other systems or models. Data sources and feature vectors used in generating a fairness score may include trader data, marketplace participant device location data, latency data, historical trading data, or marketplace data of the many types described herein that may assist with generating a fairness score. Such artificial intelligence systems used for generation (such as the generation of scores or generation of content), in the present example and other examples described herein, may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to calculate the financial advantage that a trader would have experienced had he or she been trading with less latency. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to calculate the financial advantage that a trader would have experienced had he or she been experiencing less latency, such as based on a training data set of outcomes. In embodiments, the intelligent services system 20243 may include an input set of training data representing financial advantage calculations by a set of human experts and/or by other systems or models. Data sources and feature vectors used for calculating a financial advantage may include trader data, marketplace participant device location data, latency data, or marketplace data of the many types described herein that may assist with calculating a financial advantage that a trader would have experienced had he or she been experiencing less latency. Such artificial intelligence systems used for calculation, in the present example and other examples described herein, may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to determine the risk tolerance of a trader. For example, the intelligent services system 20243 may receive data from various sources described throughout this document and the documents incorporated by reference herein and may generate a set of feature vectors based on the received data. The intelligent services system 20243 may input the feature vectors into machine-learned models trained (e.g., using a combination of simulation data and real-world data) to determine the risk tolerance of a trader. In embodiments, the intelligent services system 20243 may include an input set of training data representing trader risk tolerance by a set of human experts and/or by other systems or models. Data sources and feature vectors used for determining the risk tolerance of a trader may include trader profile data, historical trading data for the trader, external (including social media content related to the trader), or marketplace data of the many types described herein that may assist with determining the risk tolerance of a trader.

The foregoing examples are non-limiting examples and the intelligent services system 20243 may be used for any other suitable AI/machine-learning related tasks that are performed with respect to industrial facilities.

In embodiments, the platform 20500 includes an intelligent matching system 20230 for performing AI-driven order matching. In embodiments, intelligent matching system 20230 may leverage order matching algorithms. In embodiments, order matching algorithms may include, but are not limited to, allocation, FIFO, FIFO with LMM, FIFO with top order and LMM, pro-rata, configurable, threshold pro-rata, and threshold pro-rata with LMM algorithms.

In embodiments, the platform 20500 includes a fairness engine 20268 that monitors the execution engine 20228 and calculates the fairness of a transaction. In embodiments, the fairness calculation may be used to adjust the operation of the intelligent matching system 20230 such that the intelligent matching system 20230 optimizes the fairness of future trades.

In embodiments, the fairness calculation may be used to generate individual fairness scores for traders. In some embodiments, the fairness score may be an accumulated score that has value and can be traded as a part of the overall system. For example, a market participant (e.g., a trader) may have a negative trading fairness score and may trade to increase his or her trading fairness score. In embodiments, the fairness score may be based on the time of placement (rather than the time of receipt) of a bid or ask. In embodiments, the fairness engine 20268 may be configured to calculate the advantage (such as in dollars or other measures) that the trader would have experienced had he or she been trading with less latency. In some embodiments, the Local Market Maker (LMM) trades may decrease the quality of the trade (e.g., by increasing the price). In embodiments, the fairness may be based on or include a measure of the value of the disadvantage to the trader, wherein the value accumulates over time and the intelligent matching system 20230 works to reduce the value of the fairness disadvantage with future advantageous trades.

In embodiments, a fairness engine may include an execution timing fairness engine that may determine or receive a set of measures of latency for a set of users, such as traders, and may automatically orchestrate a set of configuration parameters or other features that mitigate unfairness that may be caused by disparate latency (such as unfairness resulting from front-running, rapid execution of trades based on emerging information, and the like). In embodiments, latency may result from a number of factors, including processing performance of edge computational network devices, the network path through which a set of data packets travels, the network protocol used to transport data packets, the type and physical characteristics (e.g., length of fiber optic wire) of physical layer used to transport data packets, the number of coupling nodes present in the data path, the performance of databases and other data repositories (e.g., input/output performance), and the computational performance of systems used to execute algorithms that determine actions, such as trades. In embodiments, latency may be determined by testing network return times, such as by determining the ping, the upload speed, the download speed, or the like, such as using publicly available systems for testing those parameters. In other embodiments, latency may be determined by testing responsiveness of systems to a set of stimuli, such as by observing the response of a system (such as an algorithmic trading system) to a set of stimuli, e.g., observing how quickly the system executes a trade in response to an event, such as a bid/ask event, a news event, or the like. In embodiments, the fairness engine may detect the use of a quantum computation system, a quantum algorithm, or the like and may adjust execution to account for the advantages of quantum computation or quantum algorithmic execution. This may include providing a set of stimuli that is capable of solution only by quantum computational or algorithmic techniques and detecting responses from identified trading systems. In embodiments, detection may include detection of trading behavior that includes evidence of utilization of entangled states, such as involving simultaneously executed trades across different marketplaces that may be governed by the platform 20500.

In embodiments, configuration or orchestration may include any set of techniques that are designed to mitigate advantages in latency that result from any of the foregoing causes of latency. For example, in embodiments, configuration or orchestration may include grouping traders into cohorts that experience similar latency, such that trades are executed only among members of a cohort. Configuration or orchestration may include automatically imposing a delay on low-latency instructions, such as to cause such instructions to be executed with average latency, with a minimum threshold latency, or the like. Configuration or orchestration may include deploying computational or network resources that improve latency for high-latency users, such as by using network coding technologies (e.g., random linear network coding, polar coding, and the like), path-based routing technologies, caching technologies, load balancing technologies, and the like to diminish latency, such as to an average level of latency, a minimum threshold level of latency, or the like. Configuration or orchestration may include applying incentives and/or penalties, such as by imposing additional trading costs on low-latency traders and/or rewards or incentives for high-latency traders. Incentives or penalties may, in embodiments, be accumulated in fiat currency, in a cryptocurrency, and/or in a token, such as a marketplace-specific token, such as where tokens accumulated as a result of a fairness disadvantage may be traded for value in the marketplace. In embodiments, configuration parameters may be based on an average latency across a cohort of users and may apply to diminish or eliminate disadvantages to a subset of users that experience latency within a defined difference from the average, such as not more than 25% more latency, not more than 50% more latency, not more than 75% more latency, not more than double latency, not more than triple latency, or the like. Setting a limit on the applicability of the fairness engine may avoid or mitigate users intentionally using low-performance systems to acquire advantages in the system. Configuration or orchestration may include setting parameters to eliminate fairness disadvantages entirely, or it may include setting parameters to mitigate fairness disadvantages to an extent, while still allowing faster systems to experience some advantage.

In embodiments, an execution fairness timing engine may be employed in other areas, such as to ensure fair execution among players in online games or other environments where users compete to undertake actions and outcomes depend on the relative timing of the actions.

In embodiments, the platform 20500 may include a loyalty system 20270 for monitoring the data generator in the execution engine 20228 to determine when non-cancelled orders are placed. In embodiments, the loyalty system 20270 allows volume amounts for trading to grow as a party's presence in the market increases. In embodiments, the loyalty system 20270 allows points to be accumulated as trades are made. In these embodiments, the point accumulation may be made at a delay (such as a one-minute delay, a five-minute delay, a ten-minute delay, a one-hour delay, or the like), such as to allow for efficient application construction. In embodiments, the overall value of the trades made are captured and points may be calculated based on metrics such as total volume, total value to the market, and the like. The matching algorithms of the intelligent matching system 20230 may be adjusted to provide more favorable outcomes based on the loyalty level of the trader. In addition, new traders to a marketplace may request higher loyalty status based on moving their existing business to the new marketplace. Points may be embodied in tokens, such as cryptographically secure tokens, which, in embodiments, may be tradeable for value in the market, or the like.

In embodiments, the platform 20500 may include a latency factor module 20239 for calculating a user's latency. This latency factor may be received by the intelligent matching system 20230 to provide a more balanced trading position for more remote traders.

In embodiments, the intelligent matching system 20230 may enable users to place trades using secret algorithms. In embodiments, a trader may provide a time window for the trade and an associated secret algorithm via a GUI provided by the platform 20500. For example, a user may input a second peak price or price over 48.100. Continuing the example, the intelligent matching system 20230 would only publish the first price 48.100 and then the bid or ask will adjust the price based on the associated secret algorithm. As this algorithm is executing on the trading system, the geographic advantage is removed. As the behavior is multifaceted, other traders cannot tell what they expect the bid or ask to do in response to market trades.

In some embodiments, the intelligent matching system 20230 is configured to support quantum order matching. Quantum order matching may allow users, such as counterparties, to coordinate activities, such as simultaneous buy or sell activity that happens in geographically distributed markets. This allows for parties to have identical (but unknown to each other) positions that can then be used as part of a sophisticated mechanism to manage the risk of a portfolio. In embodiments, the quantum computing system 20214 has entangled states with other quantum computing systems. These entangled states may be resolved to a known state at a predetermined point in time, which may be used to determine the outcome of a trading action. These positions are then considered to be coordinated remotely. This allows simultaneously larger positions to be moved (e.g., by bidding, asking, buying, selling, or the like) in multiple locations without the individual markets being forewarned of the overall change in position.

In some embodiments, the platform 20500 includes a deterministic state execution machine. A sequence of selling and buying may be built around deterministic state execution machine. This deterministic state execution machine may provide the same output given an identical input. The deterministic process allows for parallel market execution and trade determination processes (including cancellations) to provide for linear scaling of intelligent matching. In embodiments, the intelligent matching system 20230 reads order data (such as from an order book) in an organized and deterministic way. By following a deterministic process using systems like finite state machines, simple allocation engines, or other non-random processes, the execution process can always be run in parallel, allowing for multiple matching engines to exist and handle redundancy and parallelism.

In embodiments, the platform 20500 includes a state machine. In embodiments, the state of a marketplace is held in this state machine, which may be subject to deterministic and nondeterministic state processes. This allows for the management of a complex number of factors in trade execution (such as loyalty and random outcomes). The overall state transition process is logged to allow for audit of the process so that regulators can always determine why an outcome happened.

In embodiments, the platform 20500 includes a cancel order engine for receiving and processing cancelled orders. In embodiments, cancelled orders may be processed by the execution engine 20228. In embodiments, the platform 20500 includes a passive matching engine. In embodiments, the passive matching engine may be configured to identify messages submitted by the marketplace participant user devices 20218 and run identical state machine and identical code of the primary engine as backup to the intelligent matching system 20230. In embodiments, machine learning and/or AI algorithms may be leveraged to generate a decision of which matching engine to use. In embodiments, the platform includes an order book, which may refer to the list of orders that a marketplace uses to record offers to buy and sell assets.

In embodiments, the quantum computing system 20214 may support many different quantum models, including, but not limited to, the quantum circuit model, quantum Turing machine, adiabatic quantum computer, one-way quantum computer, quantum annealing, and various quantum cellular automata. Under the quantum circuit model, quantum circuits may be based on the quantum bit, or "qubit", which is somewhat analogous to the bit in classical computation. Qubits may be in a 1 or 0 quantum state, or they may be in a superposition of the 1 and 0 states. However, when qubits have measured the result of a measurement, qubits will always be in either a 1 or 0 quantum state. The probabilities related to these two outcomes depend on the quantum state that the qubits were in immediately before the measurement. Computation is performed by manipulating qubits with quantum logic gates, which are somewhat analogous to classical logic gates.

In embodiments, the quantum computing system 20214 may be physically implemented using an analog approach or a digital approach. Analog approaches may include, but are not limited to, quantum simulation, quantum annealing, and adiabatic quantum computation. In embodiments, digital quantum computers use quantum logic gates for computation. Both analog and digital approaches may use quantum bits or qubits.

A market orchestration process executed by the platform 20500 may be a process whereby an asset (such as a product, service, or the like) is introduced into a tradable form. In traditional market embodiments, assets may refer to bonds, stocks, cash, and the like, including any of the wide variety described herein and/or in the documents incorporated herein by reference. In non-traditional market embodiments, assets may refer to 3D printed products, 3D printing instructions and other instruction sets, resources (such as energy, computation, storage, or the like), attention or other user behavior, services (such as computer programming services, microservices, process automation services, artificial intelligence services, and many others), and the like, including the many other examples described herein and/or in the documents incorporated herein by reference. In embodiments, the market orchestration processes using quantum optimization via the quantum computing system 20214 may apply equally to traditional and non-traditional asset marketplaces. Furthermore, embodiments may combine non-traditional assets and traditional assets in order to extend traditional markets into non-traditional and hybrid market modules.

In embodiments, the quantum computing system 20214 includes a quantum annealing module 20203 wherein the quantum annealing module may be configured to find the global minimum or maximum of a given objective function over a given set of candidate solutions (e.g., candidate states) using quantum fluctuations. As used herein, quantum annealing may refer to a meta-procedure for finding a procedure that identifies an absolute minimum or maximum, such as a size, length, cost, time, distance, or other measures, from within a possibly very large, but finite, set of possible solutions using quantum fluctuation-based computation instead of classical computation. The quantum annealing module 20203 may be leveraged for problems where the search space is discrete (e.g., combinatorial optimization problems) with many local minima, such as finding the ground state of a spin glass or the traveling salesman problem.

In embodiments, the quantum annealing module 20203 starts from a quantum-mechanical superposition of all possible states (candidate states) with equal weights. The quantum annealing module 20203 may then evolve, such as following the time-dependent Schrödinger equation, a natural quantum-mechanical evolution of systems (e.g., physical systems, logical systems, or the like). In embodiments, the amplitudes of all candidate states change, realizing quantum parallelism according to the time-dependent strength of the transverse field, which causes quantum tunneling between states. If the rate of change of the transverse field is slow enough, the quantum annealing module 20203 may stay close to the ground state of the instantaneous Hamiltonian. If the rate of change of the transverse field is accelerated, the quantum annealing module 20203 may leave the ground state temporarily but produce a higher likelihood of concluding in the ground state of the final problem energy state or Hamiltonian.

In some implementations, the quantum computing system 20214 includes a trapped ion quantum computer module 20205, which may be a quantum computer that applies trapped ions to solve complex problems. Trapped ion quantum computer module 20205 may have low quantum decoherence and may be able to construct large solution states. Ions, or charged atomic particles, may be confined, and suspended in free space using electromagnetic fields. Qubits are stored in stable electronic states of each ion, and quantum information may be transferred through the collective quantized motion of the ions in a shared trap (interacting through the Coulomb force). Lasers may be applied to induce coupling between the qubit states (for single-qubit operations) or coupling between the internal qubit states and the external motional states (for entanglement between qubits).

In embodiments, the quantum computing system 20214 may include arbitrarily large numbers of qubits and may transport ions to spatially distinct locations in an array of ion traps, building large, entangled states via photonically connected networks of remotely entangled ion chains.

In embodiments, a traditional computer, including a processor, memory, and a graphical user interface (GUI), may be used for designing, compiling, and providing output from the execution, and the quantum computing system 20214 may be used for executing the machine language instructions. In embodiments, the quantum computing system 20214 may be simulated by a computer program executed by the traditional computer. In such embodiments, a superposition of states of the quantum computing system 20214 can be prepared based on input from the initial conditions. Since the initialization operation available in a quantum computer can only initialize a qubit to either the $|0\rangle$ or $|1\rangle$ state, initialization to a superposition of states is physically unrealistic. For simulation purposes, however, it may be useful to bypass the initialization process and initialize the quantum computing system 20214 directly.

According to embodiments herein, the quantum computing system 20214 may perform quantum trading orchestration, which may be configured to optimize difficult-to-correlate, related cross-chain and cross-channel interactions that, when added together through the use of quantum computing, make up an individualized marketplace experience.

In embodiments, the quantum computing system 20214 may include quantum input filters 20209. In embodiments, quantum input filters 20209 may be configured to select whether to run a model on the quantum computing system 20214 or to run the model on a classic computing system. In some embodiments, quantum input filters 20209 may filter data for later modeling on a classic computer. Typically, cross-market platform interactions are interactions across multiple market platforms. In a dynamic market orchestration trading atmosphere, service providers and market platforms must be able to engage with agents on all levels, from varying delivery devices to varying platforms, both traditional and innovative. Engagement may need to be delivered in real-time, with genuine transparency and individualized responses. In embodiments, the quantum computing system 20214 may become an integral part of this interaction and allow for the service providers to connect with market platforms in an optimized and efficient way. In embodiments, the quantum computing system 20214 may provide input to traditional compute platforms while filtering out unnecessary information from flowing into distributed platform systems. In some embodiments, the platform 20500 may trust through filtered specified experiences for intelligent agents.

Quantum computers are commercially available, but they remain expensive and limited in capacity, and quantum algorithms are available only for a subset of the host of problems to which they may be applied. Accordingly, the advantages of use of quantum computation within the platform 20500 (the benefits relative to the costs) are likely to be episodic. In embodiments, a platform for marketplace orchestration system platform 20500 or other platforms may include model or system for automatically determining, based on a set of inputs, whether to deploy quantum computational or quantum algorithmic resources to a marketplace activity (such as trade configuration), whether to deploy traditional computational resources and algorithms, or whether to apply a hybrid or combination of them. In embodiments, inputs to a model or automation system may include trading patterns, energy cost information, capital costs for computational resources, development costs (such as for algorithms), operational costs (including labor and other costs), performance information on available resources (quantum and traditional), market price and volume information, market volatility, and any of the many other data sets that may be used to simulate (such as using any of a wide variety of simulation techniques described herein and/or in the documents incorporated herein by reference) and/or predict the difference in outcome between a quantum-optimized result and a non-quantum-optimized result from a trading strategy. A machine learned model may be trained, such as by deep learning on outcomes or by a data set from human expert decisions, to determine what set of resources to deploy given the input data for a given marketplace. The model may itself be deployed on quantum computational resources and/or may use quantum algorithms, such as quantum annealing, to determine whether, where, and when to use quantum systems, conventional systems, and/or hybrids or combinations.

In embodiments, the quantum computing system 20214 includes quantum output filters 20211. In embodiments, quantum output filters 20211 may be configured to select a solution from solutions of multiple neural networks. For example, multiple neural networks may be configured to generate solutions to a specific problem (such as the optimal trading strategy within a marketplace and/or across a set of marketplaces, given a set of input data), and the quantum output filter 20211 may select the best solution from the set of solutions.

In some embodiments, the quantum computing system 20214 connects and directs a neural network development or selection process. In this embodiment, the quantum computing system 20214 may directly program the weights of a neural network such that the neural network gives the desired outputs. This quantum-programmed neural network may then operate without the oversight of the quantum computing system 20214, but will still be operating within the expected parameters of the desired computational engine.

In embodiments, the quantum computing system 20214 includes a quantum database engine 20213. In embodiments, quantum database engine 20213 may assist with the recognition of individuals and identities across market platforms by establishing a single identity that is valid across interactions and touchpoints. Aligning to a trader's transaction path, this "stitching" together of cross-device and market platform entities may facilitate building a strong underlying dataset. The quantum database engine 20213 may be configured to perform optimization of data matching and intelligent traditional compute optimization to match individual data elements between roles. Matching may be used to establish an identity of a counterparty, such as by matching patterns of trading, such as based on various data inputs, including trade types, timing, geolocation, and the like, among many others.

A quantum rules-based predictive transaction path selection may be based on having granular, agent-level interaction and behavioral data. That knowledge, which may come from internal systems as well as third-party data sources, may be made actionable through automated triggers set up to respond to specific buyer actions. These individual triggers and levels may be monitored and optimized through the application of quantum optimization engines that can oversee the entire process.

The quantum computing system 20214 may include, but is not limited to, analog quantum computers, digital computers, and/or error-corrected quantum computers. Analog quantum computers may directly manipulate the interactions between qubits without breaking these actions into primitive gate operations. In embodiments, quantum computers that may run analog machines include, but are not limited to, quantum annealers, adiabatic quantum computers, and direct quantum simulators. The digital computers may operate by carrying out an algorithm of interest using primitive gate operations on physical qubits. Error-corrected quantum computers may refer to a version of gate-based quantum computers made more robust through the deployment of quantum error correction (QEC), which enables noisy physical qubits to emulate stable logical qubits so that the computer behaves reliably for any computation. Further, quantum information products may include, but are not limited to, computing power, quantum predictions, and quantum inventions.

In embodiments, the platform 20500 facilitates one or more intelligent agents 20234 to perform research on electronic marketplace assets, shop and/or scan in different markets, compare marketplaces and assets, discuss assets and market benefits, engage proactively in the facilitation of markets, ask questions, read reviews, and weave through a variety of mediums and paths before initiating facilitation of a marketplace. In some embodiments, the intelligent agents 20234 may be automated systems that are engaged in the process of building an electronic marketplace. In embodiments, intelligent agents 20234 may be configured to identify marketplaces that may benefit from merging because of similar assets, similar configuration parameters 20306, similar rules, similar traders, and the like. In embodiments, intelligent agents 20234 may be configured to merge the identified marketplaces. In some embodiments, intelligent agents 20234 may be configured to identify marketplaces that may benefit from splitting into multiple marketplaces. In some embodiments, intelligent agents 20234 may be configured to split the identified marketplace(s). In embodiments, the quantum computing system 20214 may be configured to allow selected data streams to come together and produce optimized directions to the automated marketplace process.

In some embodiments, the quantum computing system 20214 is configured as an engine that may be used to optimize traditional computers, minimize the cost of trade in the marketplace, identify and set up systems to act on arbitrage opportunities, and/or combine data from multiple sources into a decision-making process.

The data gathered in the process of the market orchestration may involve real-time capture and management of interaction data by a wide range of tracking capabilities, both directly associated with transactions and indirectly related to transactions. In embodiments, the quantum computing system 20214 may be configured to accept cookies, email addresses, and other contact data, social media feeds, news feeds, event and transaction log data (including transaction events, network events, computational events, and many others), event streams, results of web crawling, distributed ledger information (including blockchain updates and state information), results from distributed or federated queries of data sources, streams of data from chat rooms and discussion forums, and many others.

In embodiments, the quantum computing system 20214 includes a quantum register 20215 having a plurality of qubits. Further, the quantum computing system 20214 may include a quantum control system 20219 for implementing the fundamental operations on each of the qubits in the quantum register and a control processor for coordinating the operations required.

In embodiments, the quantum computing system 20214 is configured to optimize a marketplace and/or pricing of assets in a marketplace. In an aspect, the quantum computing system 20214 is configured to solve very largely arbitrage-related optimization problems across marketplaces. For example, the quantum computing system 20214 may solve the ideal asset pricing across marketplaces. In embodiments, the quantum computing system 20214 may utilize quantum annealing to provide optimized asset pricing. In embodiments, the quantum computing system 20214 may use q-bit based computational methods to optimize asset pricing. In some embodiments, the quantum computing system 20214 is configured to solve arbitrage-related optimization problems across marketplaces.

In embodiments, the quantum computing system 20214 and/or artificial intelligence system of the platform 20500 may be used to determine a rate of exchange between, among, or across a set of marketplaces, including ones that trade in different fiat currencies, cryptocurrencies, tokens, in-kind value (e.g., exchanges of services), or other units of exchange, such as by simulating a set of trading activities involving the set of marketplaces. For example, an exchange rate may be determined between a renewable energy credit marketplace and a cryptocurrency marketplace (e.g., for Bitcoin™), between a pollution credit marketplace and an advertising marketplace, between a stock market and a bond market, between different fiat currencies, between various fiat and cryptocurrencies, between an advertising marketplace and a loyalty marketplace, and the like, optionally including any pair or other combination of any of the types of marketplace described herein and/or in the documents incorporated by reference herein. Determining an optimal exchange range may allow a market orchestrator to adjust an exchange rate to make it closer to optimal and/or it may be used to identify arbitrage opportunities and/or currency trading opportunities that arise from sub-optimal exchange rates being offered in the marketplace(s).

In embodiments, the quantum computing system 20214 is configured to optimize a portfolio. A quantum-enhanced portfolio optimization may include building a portfolio of assets to yield the maximum possible return while minimizing the amount of risk or maintaining a risk tolerance. Quantum enhancement may provide more precise methods of optimizations where the risk/reward balance is calculated inside the quantum computing system 20214. In embodiments, the quantum computing system 20214 invests in a wide variety of asset types and classes to provide the appropriate level of diversification of the portfolio. In embodiments, quantum enhancement is undertaken with awareness of volatility, and in particular volatility that may emerge from chaotic behavior of relevant marketplace entities (such as where behavior of the entities is highly sensitive to initial conditions), such that optimization is applied (optionally automatically) to situations where an optimal solution is less likely to devolve rapidly to a sub-optimal behavior as a results of chaotic behavior. For example, quantum enhancement may be more effective to optimize strategies involving very large numbers of interactions of entities that change relatively slowly, rather than interactions among very rapidly changing entities, where slight errors in measurement of initial conditions may rapidly propagate. In embodiments, models of trading strategies, arbitrage strategies, exchange rate optimization, and many others may include error estimation factors based on an understanding of sensitivity to initial conditions, chaotic/fractal behavior of entities, and the like, which may include an error detection and sensitivity estimation engine configured to estimate and/or simulate the sensitivity of a quantum optimized model or other model described herein to potential errors in state information or other information used to populate the model.

In embodiments, the use of the quantum computing system 20214 to determine asset classes for investment is a risk-mitigation strategy. Asset classes may include types of securities, debt and equities, and the like (as with other examples throughout this disclosure, except where context indicates otherwise, mentions of asset classes throughout this disclosure may refer to any of the types described herein and/or in the documents incorporated by reference herein), and each asset class may have quite different return and risk characteristics. In embodiments, vastly different types of asset classes may be combined together to provide an efficient portfolio. By way of example, a quantum optimization may include a mixture of commodities, equities, cryptocurrencies, bonds, and other assets, such as including various pairs and combinations that are mutually countercyclical in nature in order to mitigate overall risk.

In embodiments, the quantum computing system 20214 or other systems of the platform 20500 may spread its investment across asset classes, including a mixture of traditional assets and non-traditional assets. In embodiments, traditional assets may include, but are not limited to, bonds, income-generating bonds, stocks, commodities, contracts, cash, and cash equivalents, and cybercurrency. In embodiments, non-traditional assets may include, but are not limited to, three-dimensional printed product markets, private company funding facilities, trade services, and programming services.

In some embodiments, the quantum computing system 20214 or other systems of the platform 20500 may be configured to provide a marketplace that trades on the bond and commodities markets and exposes the buyers and sellers to a higher-level security and that has a risk profile similar to a mutual fund.

In some embodiments, the quantum computing system 20214 or other systems of the platform 20500 may be configured to predict volatility in assets and/or markets, enabling a lower risk profile for investment strategies. In embodiments, the quantum computing system 20214 or other systems of the platform 20500 may be applied to manage defined risk factors, providing markets where buyers and sellers are operating at higher or lower levels of risk.

In some embodiments of the present invention, the quantum computing system 20214 or other systems of the platform 20500 may assign an optimization weight for each asset class (and all assets within each class) traded in a marketplace. In embodiments, the weight may be defined as the percentage of the portfolio that concentrates within any particular class. For example, the quantum computing system 20214 or other systems of the platform 20500 may apply a 10% weight to stocks and a 20% weight to bonds. This weighting results in bonds being twice as important as stocks in the portfolio. In examples, the quantum computing system 20214 or other systems of the platform 20500 may assign sub-weights to slow-growth stocks and fast-growth stocks at 20% and 10%, respectively. The implementation of the quantum computing system 20214 or other systems of the platform 20500 with associated classical computing systems may enable the continuing maintenance of these asset weights. In embodiments, the quantum computing system 20214 or other systems of the platform 20500 may be configured to adjust the weights to produce the desired risk profile for the overall portfolio.

According to embodiments herein, the user may assign asset weights based upon his/her risk and return tolerance. If the user hopes to minimize the risk, he or she would assign greater weight to low-risk, low-growth assets. In the example above, the quantum computing system 20214 or other systems of the platform 20500 has performed the similar procedure by assigning twice as much weight to safe investments as profitable ones.

In some implementations, the quantum computing system 20214 or other systems of the platform 20500 may perform a plurality of specific assessments, such as determining the investment goals of a trader, the risk tolerance of the trader, and the like. Upon performing the specific assessments, the quantum computing system 20214 or other systems of the platform 20500 may assign weights to different asset classes to maintain the balance between the risk and return preferences. The quantum computing system 20214 or other systems of the platform 20500 may seek an efficient frontier, which may refer to a maximum amount an investment can earn given its established risk level.

For example, if the quantum computing system 20214 or other systems of the platform 20500 determines that a 20% risk of loss is the trader's risk tolerance, the quantum computing system 20214 or other systems of the platform 20500 will build a portfolio that can make the most money possible without exceeding that risk threshold. Continuing the example, the quantum computing system 20214 or other systems of the platform 20500 may select the following assets for its portfolio based on each one's promised returns: Bond ABC (risk 10%), Stock XYZ (risk 50%), and Stock TUV (risk 30%).

In embodiments, the quantum computing system 20214 includes a quantum computation module 20221 to calculate the weights. Typically, in a non-optimized portfolio, the users might place too much money in Bond ABC, thus reducing the possible returns, or over-invest in Stock XYZ, which would create too much risk. So, the quantum computation module 20221 calculates exactly how much of each stock is required for the user.

While a traditional computation module cannot solve the equations below due to high number of permutations of options, the quantum computing system 20214 may make an investment decision based on meeting desired end use parameters.

$$\text{Weight}(ABC)+\text{Weight}(XYZ)+\text{Weight}(TUV)=1 \quad \text{(Equation 1)}$$

$$0.1*\text{Weight}(ABC)+0.5*\text{Weight}(XYZ)+0.3*\text{Weight}(TUV)=0.2 \quad \text{(Equation 2)}$$

In some embodiments, the quantum computing system 20214 or other systems of the platform 20500 is configured to select transactions to build a desired position in a particular market. The quantum computing system 20214 or other systems of the platform 20500 may build a desired position in the market by evaluating possible transactions and factoring consequences of each transaction.

In embodiments, the quantum computing system 20214 or other systems of the platform 20500 utilize a pyramiding method of increasing margin by using unrealized returns from successful trades. The pyramiding method may refer to only adding to positions that are turning a profit and showing signals of continued strength. These signals could be continued as asset prices reach to new highs or the asset prices retreat to previous lows. The pyramiding method takes advantage of trends, adding to the user's position size with each wave of that trend. Further, the quantum-enabled pyramiding method is also beneficial in that risk (in terms of maximum loss) does not have to increase by adding to a profitable existing position. Original and previous additions will all show profit before a new addition is made, which means that any potential losses on newer positions are offset by earlier entries.

In embodiments, the quantum computing system 20214 or other systems of the platform 20500 are configured to generate a ranked list of assets. In embodiments, the quantum computing system 20214 or other systems of the platform 20500 may utilize a factor investing approach that involves targeting quantifiable factors that can explain differences in asset returns. In a long-only portfolio, a systematic factor investing strategy will overweight assets that rank highly on a certain factor and underweight assets that rank poorly on that factor. The factors explain exactly why the portfolio is positioned the way it is and what the drivers of return are every time.

In embodiments, the quantum computing system 20214 or other systems of the platform 20500 may utilize a value investing approach for picking stocks that appear to be trading for less than their intrinsic or book value. In value investing, equity valuations may be quantified by the ratio of a fundamental anchor-like book value, earnings, or cash flows-over price. In embodiments, the quantum computing system 20214 or other systems of the platform 20500 may be configured to perform a valuation of an asset or a set of assets.

In some embodiments, the quantum computing system 20214 or other systems of the platform 20500 utilize a momentum investing approach for buying assets that have had high returns over the past three to twelve months and selling those that have had poor returns over the same period. In the momentum investing approach, the assets that have recently outperformed will tend to do better than assets that have recently underperformed. In some embodiments, momentum is calculated over the last 12-months price return of an asset.

In embodiments, the quantum computing system 20214 or other systems of the platform 20500 are configured to generate a ranked list of companies. In some embodiments, in the building of trading strategies, the given ranking is based on confidence intervals of the performance of a set of related or comparable assets and/or companies.

In embodiments, the platform 20500 or other systems of the platform 20500 may apply rankings of a series of companies to enable deeper comparative basis than a simple selection of the top or bottom assets. In an example, the platform 20500 may be tasked with investing in ten assets based on the company ranking. Continuing the example, suppose asset X is among these ten assets and is predicted to have a ranking between second and sixth. In embodiments, the quantum computing system 20214 or other systems of the platform 20500 leverage a ranking model to find the optimal ranking. In some embodiments, the ranking model uses the portfolio weights to maximize an objective function, even for the worst realization of the ranking within the uncertainty set.

In embodiments, the quantum computing system 20214 or other systems of the platform 20500 are configured to generate a ranked list of potential transactions. In embodiments, the quantum computing system 20214 or other systems of the platform 20500 apply ranked lists of potential transactions to rebalance a portfolio. The quantum computing system 20214 or other systems of the platform 20500 may be configured to undertake the rebalancing with the goal of minimizing the explicit (e.g. commission) and implicit (e.g. bid/ask spread and impact) costs associated with trading.

In some embodiments, trading costs and constraints may be explicitly considered within portfolio construction. For example, a portfolio optimization that seeks to maximize exposure to some alpha source may incorporate explicit measures of transaction costs or constrain the number of trades that are allowed to occur at any given rebalance.

In some embodiments, the portfolio construction and trade optimization occur in a two-step process. For example, a portfolio optimization may take place that creates the "ideal" portfolio, ignoring consideration of trading constraints and costs. The quantum computing system 20214 or other systems of the platform 20500 may then undertake trade optimization as a second step, seeking to identify the trades that would move the current portfolio "as close as possible" to the target portfolio while minimizing costs or respecting trade constraints.

In embodiments, the quantum computing system 20214 or other systems of the platform 20500 are configured to optimize counterparty matching. In embodiments, the quantum-based matching is based at least in part on complementary trading strategies of the counterparties. In some embodiments, a transaction may include many counterparties. Each marketplace of funds, goods, and services to complete a transaction may be considered as a series of counterparties. For example, if a buyer purchases a retail product online to be shipped to their home, the buyer and retailer are counterparties, as are the buyer and the delivery service. In embodiments, the management of counterparties in complex multi-step processes can be optimized to enable the efficient transfer of funds between parties. In market dealings with a counterparty, there is an innate risk that one of the parties or entities involved will not fulfill their obligations. This is especially true for over-the-counter (OTC) transactions. Examples of OTC transaction risks include, but are not limited to, a vendor not providing a good or service after a payment is processed, that a buyer will not pay an obligation if the goods are provided first, and that one party will back out of the deal before the transaction is executed but after an initial agreement is reached. In embodiments, the quantum computing system 20214 or other systems of the platform 20500 are configured to identify areas of counterparty risk, and these areas of identified risk are then managed as part of the overall quantum market orchestration.

Counterparties on a trade can be classified in several ways and may provide insights into how the market is likely to act based on presence/orders/transactions and other similar-style traders. In embodiments, examples of the counterparties include, but are not limited to, retailers, market makers, liquidity traders, technical traders, momentum traders, and arbitragers.

Retailers may refer to ordinary individual investors or other non-professional traders. They may be trading through an online broker like E-Trade or a voice broker. The quantum computing system 20214 or other systems of the platform 20500 may provide for automated traders who act as counterparties in transactions.

In embodiments, the quantum computing system 20214 or other systems of the platform 20500 provide for automated market makers (AMMs) that are participants to provide liquidity to the market. In embodiments, the AMMs may have substantial market clout and will often be a substantial portion of the visible bids and offers displayed in the order books. Profits may be made by AMMs by providing liquidity and collecting Electronic Communication Network (ECN) rebates, as well as moving the market for capital gains when circumstances dictate a profit may be capturable.

In embodiments, the quantum computing system 20214 or other systems of the platform 20500 include automated liquidity trading modules, which may refer to non-market makers who generally have very low fees and capture daily profits by adding liquidity and capturing the Electronic Communication Network (ECN) credits. As with AMMs, automated liquidity trading modules may also make capital gains by being filled on the bid (offer) and then posting orders on the offer (bid) at the inside price or outside the current market price.

In some implementations, market orchestration system platform 20500 includes quantum-enabled technical trader intelligent agents. In embodiments, the quantum-enabled technical trader intelligent agents are configured to trade based on chart levels, whether from market indicators, support, resistance, trendlines, or chart patterns. Quantum-enabled technical trader intelligent agents may be configured to watch marketplace charts for certain conditions to arise before stepping into a position.

In embodiments, market orchestration system platform 20500 includes quantum-enabled momentum trader intelligent agents. In embodiments, the quantum-enabled momentum trader intelligent agents may be of different types. Some quantum-enabled momentum trader intelligent agents may be configured to stay with a momentum stock for multiple days (even though they only trade it intraday) while others will search for “stocks on the move,” continuously attempting to capture quick sharp movements in stocks during news events, volume, or price spikes. These quantum-enabled momentum trader intelligent agents may be configured to exit when the movement is showing signs of slowing.

In embodiments, the market orchestration system platform 20500 includes quantum-enabled arbitrager intelligent agents. In some embodiments, the quantum-enabled arbitrager intelligent agents are configured to use multiple assets, markets, and statistical tools to exploit inefficiencies in the market or across markets.

In embodiments, the quantum computing system 20214 or other systems of the platform 20500 is configured to optimize order matching. In some embodiments, quantum computing system 20214 includes a quantum order matching system. In embodiments, quantum order matching system is an electronic system that matches buy and sell orders for a marketplace using quantum order matching algorithms. The quantum order matching system executes orders from participants in the marketplace.

In embodiments, orders are entered by traders and executed by a central system that belongs to the marketplace. The quantum order matching algorithm that is used to match orders may vary from system to system and may use rules around best execution. Further, the quantum order matching system and order request system 20260 may be a part of a larger electronic trading system, which may include a settlement system 20241 and a central securities depository that is accessed by electronic trading platforms.

The quantum order matching algorithms may determine the efficiency and the robustness of the quantum order matching system 20231. In embodiments, marketplaces may be configured to support continuous trading where orders are matched immediately and/or auction trading where matching is done at fixed intervals. In some embodiments, the quantum order matching system 20231 functions in an auction state at the market open when a number of orders have built up.

In some implementations, the quantum computing system 20214 or other systems of the market orchestration system platform 20500 are configured to perform opportunity discovery through the process of mining and discovery. Mining and discovery may involve traditional data mining using predictive models and/or text-based data mining modules. In embodiments, traditional data mining using the quantum computing system 20214 or other systems of the market orchestration system platform 20500 is applied to find opportunities for optimization of portfolios through trading activities.

Text mining may refer to the data analysis of natural language works (articles, books, etc.) using text as a form of data. It is often joined with data mining, the numeric analysis of data works (e.g., filings and reports), and referred to as “text and data mining” or, simply, “TDM.”

In some embodiments, TDM may be accomplished by applying quantum computational or Quantum TDM engines (QTDM) 20223 that allow computers to read and digest digital deep insights in the information far more efficiently than a human being. QTDM engines 20223 may be configured to break down digital information into raw data and text, analyze it, and determine new connections. For example, QTDM engines 20223 may determine that subtle shifts in weather patterns relate to a downturn in the price of wheat. In embodiments, the quantum computing system 20214 then applies QTDM engines 20223 to mine news feeds, social media feeds, and/or discussion boards to predict movements of markets for everything from government bonds to commodities.

In embodiments, the quantum computing system 20214 or other systems of the market orchestration system platform 20500 are configured to automatically discover smart contract configuration opportunities. Automated discovery of smart contract configuration opportunities may be based on published APIs to marketplaces and machine learning (e.g., by robotic process automation (RPA) of stakeholder, asset, and transaction types.

In embodiments, the quantum computing system 20214 includes a quantum trading engine 20225. In embodiments, smart contracts are provided by the quantum trading engine 20225 and are executed by a computer network that uses consensus protocols to agree upon the sequence of actions resulting from the smart contract's code. The result is a method by which parties can agree upon terms and trust that they will be executed automatically, with reduced risk of error or manipulation.

In embodiments, quantum-established or other blockchain-based smart contracts applications may include, but are not limited to, validating loan eligibility and executing transfer pricing agreements between subsidiaries. In embodiments, quantum-established or other blockchain-enabled smart contracts enable frequent transactions occurring among a network of parties, and manual or duplicative tasks are performed by counterparties for each transaction. The quantum-established or other blockchain acts as a shared database to provide a secure, single source of truth, and smart contracts automate approvals, calculations, and other transacting activities that are prone to lag and error.

Smart contracts may use software code to automate tasks, and in some embodiments, this software code may include quantum code that enables extremely sophisticated optimized results.

In embodiments, the quantum computing system 20214 or other system of the market orchestration system platform 20500 includes a quantum-enabled or other prospect targeting module that is configured to perform prospect targeting. In embodiments, the prospect targeting module identifies various strategies to find prospects appropriate to the market participant needs. In embodiments, the prospect targeting module participates in online communities, enabling the identification of new prospects through monitoring of sites such as Twitter™, LinkedIn™, Reddit™, and the like.

In some embodiments, the prospect targeting module generates local hashtags and applies these hashtags to find prospects associated with the specific topics of interest.

In embodiments, the prospect targeting module sponsors community events (such as digital events or physical events). In some embodiments, the prospect targeting module identifies specific online advertisements. These specific advertisements may include factors such as geographic specificity, age range, job title, essential keywords, and the nature of social engagement.

In embodiments, the quantum computing system 20214 or other system of the market orchestration system platform 20500 includes a quantum-enabled or other valuation module configured to perform valuation tasks. Valuation may be applied when trying to determine the fair value of an asset or security, which is determined by what a buyer is willing to pay a seller, assuming both parties enter the transaction willingly. When an asset trades in a marketplace, buyers, and sellers determine the market value of the asset. The concept of intrinsic value, however, refers to the perceived value of an asset based on future earnings or some other attribute unrelated to the market price of the asset. In embodiments, the valuation module is used to determine the intrinsic value of an asset. This intrinsic value may be an indicator of the over- or under-valuation of an asset.

In embodiments, the valuation module may leverage absolute valuation models and relative valuation models. In embodiments, the quantum absolute valuation models may attempt to find the intrinsic or "true" value of an investment based only on fundamentals. Fundamentals may refer to dividends, cash flow, growth rates, and the like. Absolute valuation models that may include dividend discount models, discounted cash flow models, residual income models, and asset-based models, and the like. In embodiments, the relative valuation models operate by comparing the asset in question to other similar assets. These methods may involve quantum or other calculations to determine relative performance based on quantitative input data, such as price to earnings ratio and growth numbers to compare the asset to other assets of similar types.

In embodiments, the quantum computing system 20214 or other systems of the market orchestration system platform 20500 may include a quantum-enabled or other risk identification module that is configured to perform risk identification and/or mitigation. The steps that may be taken by the risk identification module may include, but are not limited to, risk identification, impact assessment, and strategies development. In some embodiments, the risk identification module determines a risk type from a set of risk types. In embodiments, risks may include, but are not limited to, preventable, strategic, and external risks. Preventable risks may refer to risks that come from within and that can usually be managed on a rule-based level, such as employing operational procedures monitoring and employee and manager guidance and instruction. Strategy risks may refer to those risks that are taken on voluntarily to achieve greater rewards. External risks may refer to those risks that originate outside and are not in the businesses' control (such as natural disasters). External risks are not preventable or desirable. In embodiments, the risk identification module can determine cost for any category of risk. The risk identification module may perform a calculation of current and potential impact on an overall risk profile.

In embodiments, the step of risk identification module may determine the probability and significance of certain events. Furthermore, the risk identification module may be configured to anticipate events.

In embodiments, the quantum computing system 20214 or other systems of the market orchestration system platform 20500 may be configured for sampling from risk-neutral probability measures for asset pricing. In embodiments, a binomial pricing formula may be interpreted as a discounted expected value. In risk-neutral pricing, the option value at a given node is a discounted expected payoff to the option calculated using risk-neutral probabilities and the discounting is done using the risk-free interest rate. The price of the option may be calculated by working backward from the end of the binomial tree to the front. In embodiments, the derived risk-neutral probabilities are calculated by quantum computing system 20214 or other systems of the market orchestration system platform 20500, providing more precision in the overall asset price calculation.

In embodiments, the quantum computing system 20214 or other systems of the market orchestration system platform 20500 are configured for optimizing asset allocation. The quantum computing system 20214 or other systems of the market orchestration system platform 20500 may be configured to optimize the type and nature of the investment based on the requirements of the investor. For example, an investor requirement may be saving for a new car in the next year. In the present example, the investor might invest her car savings fund in a very conservative mix of cash, certificates of deposit (CDs), and short-term bonds. In a different example, an investor requirement may be placing holdings in much longer-term positions or tax optimized investments if the investor is saving for retirement that may be decades away.

Asset-allocation mutual funds, also known as life-cycle, or target-date funds, may provide investors with portfolio structures that address an investor's age, risk tolerance, and investment objectives with an appropriate apportionment of asset classes, which may be achieved through the application of quantum calculations, by artificial intelligence systems, or by other systems of the market orchestration system platform 20500.

In some embodiments, the quantum computing system 20214 or other systems of the market orchestration system platform 20500 may be configured for hash collision for proof of work in cryptocurrency mining. The value of Bitcoin comes from the difficulty of finding SHA-256 reversals or similar calculations, which gives it "proof of work". Currently, it is believed that there is no efficient classical algorithm which can invert SHA-256. Hence, the only way is a brute force search, which classically means trying different inputs until a satisfactory solution is found. The quantum computing system 20214 may be configured to solve reversal of SHA-256, thus breaking the "proof of work" requirement on cryptocurrency mining.

In embodiments, the quantum computing system 20214 is configured for quantum-driven Monte Carlo for derivative pricing. The Quantum Monte Carlo (QMC) valuation relies on risk-neutral valuation. In the QMC valuation, the price of the option is its discounted expected value. In embodiments, the QMC valuation technique includes creating a quantum state combining all price paths for the underlying via simulation, resolving the QMC to calculate the optimum associated exercise value/path and discounting the payoffs to today.

In embodiments, the quantum computing system 20214 is configured for quantum-driven Monte Carlo for credit valuation adjustment. Counterparty credit risk (CCR) may refer to the risk that a party to a derivative contract may default before the expiration of the contract and fail to make the required contractual payments. The Quantum Monte Carlo counterparty credit risk (CCR) estimation framework estimators may be developed based on quantum applications of such as quantum implementation of mean square error (MSE) reduction techniques In embodiments, the quantum computing system 20214 is configured for imaginary-time propagation for multi-asset Black Scholes equation. The Black-Scholes equation may be interpreted from quantum mechanics as the imaginary time Schrödinger equation of a free particle. When deviations of the quantum state of equilibrium are considered, related to market imperfection, such as cost, data challenge, short-term volatility, discontinuities, or serial correlations, the classical non-arbitrage assumption of the Black-Scholes model is violated, implying a non-risk-free portfolio. An arbitrage environment is a necessary condition to embedding the Black-Scholes option pricing model in a more general quantum physics setting.

In some embodiments, the quantum computing system 20214 or other systems of the platform 20500 are configured for accelerated sampling from stochastic processes for risk analysis. In embodiments, quantum-simulated accelerated testing is initialized to hold accelerated life tests with constant-stress loadings, including accelerated degradation tests and time-varying stress loadings. This quantum-accelerated testing results access product reliability and assists with the design of warranty policy.

In embodiments, the quantum computing system 20214 or other systems of the market orchestration system platform 20500 are configured for graph clustering analysis for anomaly and fraud detection. In embodiments, the quantum computing system 20214 or other systems of the market orchestration system platform 20500 are configured for identifying a fraudulent account application. In embodiments, identifying a fraudulent account application may include receiving a new account application comprising a plurality of identity-related fields and linking the identity-related fields associated with the new account application with identity-related fields associated with a plurality of historical account applications. In embodiments, this quantum-enabled fraud detection determines the likelihood that the new account application is fraudulent.

In some embodiments, the quantum computing system 20214 includes a quantum prediction module, which is enabled to accurately predict future market trends. In addition, the quantum prediction module may be configured to generate forecast financial time series, especially for the Foreign Marketplace (FX). Furthermore, the quantum prediction module may construct classical prediction engines to further predict the market trends, reducing the need for ongoing quantum calculation costs, which can be substantial compared to traditional computers.

In embodiments, the quantum principal component analysis (QPCA) algorithm may process input vector data if the covariance matrix of the data is efficiently obtainable as a density matrix, under specific assumptions about the vectors given in the quantum mechanical form. It may be assumed that the user has quantum access to the training vector data in a quantum memory. Further, it may be assumed that each training vector is stored in the quantum memory in terms of its difference from the class means. These QPCA can then be applied to provide for dimension reduction using the calculational benefits of a quantum method.

In embodiments, the quantum computing system 20214 or other systems of the market orchestration system platform 20500 are configured for graph clustering analysis for certified randomness for proof-of-stake blockchains. Quantum cryptographic schemes may make use of quantum mechanics in their designs, which enables such schemes to rely on presumably unbreakable laws of physics for their security. The quantum cryptography schemes may be information-theoretically secure such that their security is not based on any non-fundamental assumptions. In the design of blockchain systems, information-theoretic security is not proven. Rather, classical blockchain technology typically relies on security arguments that make assumptions about the limitations of attackers' resources. In embodiments, blockchain and distributed ledger technologies have applications in market orchestration including cryptocurrencies, insurance, and securities issuance, trading, and selling. Quantum cryptographic schemes may enable nontraditional markets including, but not limited to, the music industry, decentralized IoT, anti-counterfeit solutions, internet applications, and decentralized storage.

In embodiments, the quantum computing system 20214 or other systems of the market orchestration system platform 20500 are configured for detecting adversarial systems, such as adversarial neural networks, including adversarial convolutional neural networks. For example, the quantum computing system 20214 or other systems of the market orchestration system platform 20500 may be configured to detect fake trading patterns.

In embodiments, the market orchestration system platform 20500 is configured to generate "market orchestration digital twins." The term digital twin may refer to a digital representation of a thing or set of things. A market orchestration digital twin may refer to any digital twin related to a market (including digital twins of marketplaces, assets, workflows, traders, marketplace hosts, brokers, service providers, agents, and the like). Like other systems, services, applications, and components described herein, market orchestration digital twins may be used for a wide range of applications, including participant-facing applications (including various types of users described herein) and applications that are for use by or for a host of a marketplace. These may optionally include research and development applications (including design of new features, components, and applications for the marketplace or its participants, such as those described throughout this disclosure), analytic applications (such as for providing insight relevant to trading activities, marketplace operations, and many other topics), simulations, AI-based monitoring, forecasting/prediction applications, and automation applications (including supervised, semi-supervised and fully autonomous applications, such as involving robotic process automation), among many others. Market orchestration digital twins may include asset digital twins, company digital twins, marketplace digital twins, trader (e.g., buyer and seller) digital twins, marketplace host digital twins, broker digital twins, intelligent agent digital twins, transaction workflow digital twins, marketplace workflow/process digital twins, environment digital twins and/or the like, which are discussed in greater detail throughout the disclosure.

In embodiments, digital twins may be visual digital twins and/or data-based digital twins. A visual digital twin may refer to digital twin that is capable of being depicted in a display such as a traditional 2D display, a 3D display, an augmented reality display, or a virtual-reality display. A data-based digital twin may refer to a data structure that contains a set of parameters that are parametrized to represent a state of the thing or group of things. As used herein, the term "depict" may refer to the visual display of a thing and/or a digital representation of the thing in a data structure (e.g., in a data-based digital twin). In embodiments, visual digital twins may also be data-based digital twins, and vice versa.

In some embodiments, a digital twin may be updated with real-time data, such that the digital twin reflects the state of the thing or set of things in real-time. For example, an asset digital twin of a home listed in a marketplace for real-estate may depict the physical structure of the home (e.g., walls, floors, ceilings, rooms, and the like), as well as objects appearing in the environment (e.g., appliances, fixtures, and the like). Furthermore, depending on the manner in which this digital twin is configured, the digital twin of the home may include things such as piping, electrical wire, foundation, and the like. In some implementations, the digital twin of the home may be updated with data received from sensors and devices (e.g., smart home sensors, other sensors deployed in or around the home, appliances or devices within the home, wearable devices worn by residents of the home, and/or other suitable data sources). In scenarios where the digital twin is of a process or workflow, the digital twin may depict the process or workflow, such as in a graph, flow diagram, Gantt chart, sequence list, or other representation, which may include embodiments involving directed and/or acyclic flows and/or ones including cyclical flows, such as involving loops, such feedback loops, iterative optimization, and many others. For example, in the context of a marketplace workflow, a digital twin of the workflow may depict the status and/or outcomes of different stages in the workflow, the inputs to each stage, the outputs from each stage, the processing operations of each stage, and the like. In some implementations, the market orchestration system platform 20500 may receive data from various sources (e.g., IIoT sensors, video, data from smart home devices, computing devices, or the like) and may update a digital twin involving or related to the process to reflect the received data. For example, the market orchestration system platform 20500 may receive data from sensors deployed in a shipping facility may be used to update the digital twin of a delivery process for an asset purchased from a marketplace to reflect the received data, such as to trigger a transactional term conditioned on whether an item has been shipped.

In embodiments, the digital twin system 21126 includes a digital twin data optimization system for enabling data minimization modeling for the purpose of determining minimum threshold data requirements for digital twin modeling. In embodiments, data sources, data types, and the like may be scored and/or ranked by their determined relevance, cost, ease of use, simplicity, and the like for multiple instances and/or types of digital twins. For example, when simulating the orchestration of a new marketplace, the data types thought to be of the highest value, lowest cost, least complex, and most readily obtained may be selected for use. In embodiments, artificial intelligence system of the intelligent services system 20243 may be leveraged for data selection for use in a digital twin. In embodiments, new data types and/or sources may be tested and scored and/or ranked by the digital twin data optimization system.

In embodiments, the market orchestration system platform 20500 may be configured to perform simulations using and/or with respect to one or more digital twins. In embodiments, digital twins may be configured to behave in accordance with a set of constraints, such as laws of nature, laws of physics, mechanical properties, material properties, economic principals, chemical properties, and the like. In this way, the market orchestration system platform 20500 may vary one or more parameters of a digital twin and may execute a simulation within the digital twin that conforms with real-word conditions. In embodiments, the market orchestration system platform 20500 allows users to perform simulations in a marketplace entity (e.g., an asset or a marketplace). For example, a potential buyer considering whether or not to bid on an automobile part listed in a marketplace may subject the digital twin of the automobile part to various simulations prior to making the purchase. Continuing the example, the market orchestration system platform 20500 may vary the conditions (e.g., different temperatures, humidity, motions, forces, and the like) of the environment of the automobile part. In this way, the simulation may be run to help a user decide whether to place a bid. Furthermore, in some embodiments, digital twins may be leveraged to perform simulations to predict future states of the thing or group of things and/or modeling behaviors to extrapolate states of the thing or group of things. For example, the market orchestration system platform 20500 allows users to simulate performance of an asset or a set of assets under different economic conditions by varying the economic conditions (e.g., labor market conditions, economic confidence, and the like). In examples, the market orchestration system platform 20500 may receive sensor readings from temperature sensors, humidity sensors, and fan speed sensors deployed throughout an environment where the environment is listed in a marketplace for physical storage for temperature-sensitive materials. The market orchestration system platform 20500 may apply one or more thermodynamics equations to the received sensor readings and the dimensions of the environment to model the thermodynamic behavior of the environment to determine temperatures in areas that do not have temperature sensors.

Digital twins can be helpful for visualizing the current state of a system, running simulations on those systems, and modeling behaviors, amongst other uses. Depending on the configuration of the digital twin, however, it may not be useful for different users, as the configuration of the digital twin dictates the data that is depicted/visualized by the digital twin. Thus, in some embodiments, the market orchestration system platform 20500 is configured to generate role-based digital twins. Role-based digital twins may refer to digital twins of one or more aspects of a marketplace, where the one or more aspects and/or the granularity of the data represented by the role-based digital twin are tailored to a particular role within the marketplace. In embodiments, the role-based digital twins include trader digital twins, marketplace host digital twins, and broker digital twins.

In some of these embodiments, the market orchestration system platform 20500 generates different types of market orchestration digital twins for users having different roles within the marketplace. In some of these embodiments, the respective configuration of each type of market orchestration digital twin may be predefined with default digital twin data types and default granularities. In some embodiments, a user may define the types of data depicted in the different types of market orchestration digital twins and/or the granularities of the different types of market orchestration digital twins. Granularity may refer to the level of detail at which a particular type of data or types of data is/are represented in a digital twin. For example, a marketplace host digital twin may depict information related to execution quality, percentage of orders price improved, net improvement per order, liquidity multiple, execution speed, effective spread over quoted spread, and the like, but may optionally omit depiction of an asset watch list. In examples, the trader digital twin may depict account balance information, an asset watch list, and performance data for an asset listed in a marketplace. The foregoing examples are not intended to limit the scope of the disclosure. Additional examples and configurations of different market orchestration digital twins are described throughout the disclosure.

In some embodiments, market orchestration digital twins may allow a user (e.g., a trader, a marketplace host, a broker, or the like) to increase the granularity of a particular state depicted in the digital twin (also referred to "drilling down into" a state of the digital twin). For example, a trader digital twin may depict varying granularity snapshots of an asset watch list. Continuing the example, a trader digital twin may depict a stock symbol, market capitalization, and stock price in a marketplace for stocks. In embodiments, a user (e.g., a buyer in a marketplace) may opt to drill down into the asset watch list data via a client application 20312 depicting the trader digital twin. For example, a trader in a marketplace for stocks may select a symbol associated with assets on the asset watch list. In response, the market orchestration system platform 20500 may provide higher resolution watch list data for the particular stocks, such as opening price, high price, low price, volume, P/E/market cap, 52-week high price, 52-week low price, average volume, and the like. In embodiments, market orchestration digital twins may include visual indicators of different states of the marketplace and/or marketplace entities. For example, a red icon may indicate a warning state, a yellow icon may indicate a neutral state, and a green icon may indicate a satisfactory state. As another example, varying colors or other indicators may indicate varying volatility measures for a set of defined time periods, such as hourly, daily, weekly, monthly, quarterly, annually, or the like, including volatility of price, trading volume, trade size, and others. Volatility may or may not be desirable in the context of a user's strategy; for example, day traders may seek high-volatility asset classes, while fundamental investors may be cautious about volatility (such as by using asset allocation across asset classes of varying volatility). Accordingly, indicators for volatility measures (or other measures) may be (optionally automatically) configured based on an identified trading strategy or role of a user, such as by showing more volatile asset classes in green for an interface for a day trader or other volatility-seeking strategy and showing them in yellow for an interface for a volatility-cautious strategy or role. In embodiments, the digital twin may depict strategy-aware indicators (e.g., volatility) as display elements in a digital twin. In embodiments, the digital twin may depict different colored icons to differentiate a condition (e.g., current and/or forecasted condition) of a respective data item. For example, the marketplace host digital twin may depict a red icon with execution speed data to indicate a warning state if execution speeds are slow. This may include execution speed information for the user's trading system, for the marketplace as a whole, or the like. In response, the marketplace host digital twin may depict one or more different data streams relating to the selected data item. In examples, a trader digital twin may depict a green icon with a trending asset. In yet other examples, a trader digital twin may highlight and/or depict green icons with assets recommended for purchase and highlight and/or depict red icons with assets recommended for sale, wherein the recommendations may be generated by machine learning and/or artificial intelligence, such as trained on outcomes and/or by supervised, semi-supervised, or unsupervised learning.

In some embodiments, the market orchestration system platform 20500 supports rolled-up real-time reporting. In some of these embodiments, data from IoT systems, edge and network devices (such as located on or in various premises of business operation or other points of use, located in data centers that support marketplace or other business operations, located in telecommunications networks, and/or located in other locations), wearable devices, enterprise software systems, feeds, event streams, and/or other data sources of the various types described herein or in the documents incorporated herein by reference may undergo one or more data fusion operations (at the platform and/or an edge device), and an AI-based intelligent agent 20234 may report results of analytics performed on the fused data and/or process the fused data types, such as for machine learning, decision support, automation, control operations, or other uses described herein. For instance, a set of sensors deployed on machines or equipment may report characteristics of various components of the machines or equipment. Edge devices may be configured to fuse the sensor data from an environment (e.g., a factory) with other data collected with respect to the environment, whereby the fused data is fed to the digital twin. The market orchestration system platform 20500 may then update the digital twin with the fused data, and an AI system may analyze the digital twin and/or the fused data to identify data items to report.

In embodiments, the market orchestration system platform 20500 is configured to provide a set of marketplace tools that allow for communication/negotiation between users (e.g., buyers, sellers, brokers, and the like). In some embodiments, the marketplace tools allow users to communicate with respect to and/or within one or more market orchestration digital twins. In some embodiments, users can communicate/negotiate while viewing the same digital twin or multiple digital twins. In embodiments, a twin, or an interface thereto, may share underlying data while offering configurations that allow each user to view information relevant to the user's particular role, organization, type, category, or the like. For example, an appraiser may be offered a view representing information relevant to an appraisal of an item of property that is subject to a transaction (such as physical status data, location data and historical price information for comparable assets), while a buyer may be presented with additional information, such as information setting proposed terms and conditions for a transaction (e.g., price, interest rate, timing, escrow requirements, insurance requirements, or the like).

In embodiments, the marketplace tools include a video conferencing service. In some embodiments, the video conferencing service allows users to participate in video conferences within a digital twin. In embodiments, information from video conferences may be used to populate an order request. In embodiments, information from video conferences may be used to populate a smart contract. For example, users may access an environment digital twin via a VR-head set, whereby the participants may view the environment digital twin and see avatars of other participants within the "in-twin" video conference.

In embodiments, marketplace tools include chat and/or instant messaging services. In embodiments, information from chats and/or instant messaging services may be used to populate an order request. In embodiments, information from chats and/or instant messaging services may be used to populate a smart contract request.

In embodiments, users (e.g., a marketplace host) may define the types of market orchestration digital twins that may be generated by the digital twin system 20208. In embodiments, the user may select different types of digital twins that will be supported for the marketplace by the market orchestration system platform 20500 via a GUI presented by the marketplace configuration system 20302. For example, the user may select different types of role-based digital twins from a menu of digital twin types, wherein the different types of role-based digital twins may include asset digital twins, marketplace host digital twins, trader digital twins, company digital twins (e.g., companies associated with assets), agent digital twins, appraiser digital twins, assessor digital twins, advertiser digital twins, and/or broker digital twins. In embodiments, trader digital twins may include buyer and/or seller digital twins. In some embodiments, each type of market orchestration digital twin has a predefined set of states that are depicted in the respective market orchestration digital twin and predefined granularity levels for each state of the set of states. In some embodiments, the set of states that are depicted in the market orchestration digital twin and/or the granularity of each state may be customized (e.g., by the user). In these embodiments, a user may define the different states that are represented in each type of market orchestration digital twin and/or the granularity for each of the states depicted in the digital twin. For example, a trader in a marketplace may wish to have more historical market data depicted in the trader digital twin, such that the historical market data is displayed at a higher granularity. In this example, the trader digital twin may be configured to depict the desired historical market data fields at a granularity level defined by a user (e.g., the historical market data may include historical contract changes data, historical time and sales data, and the like). In examples, a marketplace host may wish to view marketplace performance data at a lower granularity level. In this example, the marketplace host digital twin may be configured to show visual indicators that indicate whether any of the states are at a critical condition, an exceptional condition, or a satisfactory condition. For instance, if execution speed is slow, the marketplace host digital twin may depict that the marketplace performance-state is at a critical level. In this configuration, the marketplace host may select to drill down into the marketplace performance-state, where she may view the execution speed, percentage of orders price improved, net improvement per order, liquidity multiple, and the like.

In embodiments, a user may connect one or more data sources 20224 to the market orchestration system platform 20500. Examples of data sources 20224 that may be connected to the market orchestration system platform 20500 may include, but are not limited to, a sensor system 20274 (e.g., a set of IoT sensors), news sources 20278 (e.g., news websites or CNBC programming), the market data 20280 (e.g., level 1 and level 2 data), the fundamental data 20282 (e.g., asset performance data), reference data 20284 (e.g., marketplace identifiers), historical data 20288 (e.g., historical contract change data), third party data sources 20290, discussion forum data 20235, social network data 20298, regulatory data 20294, and network/edge devices 20292. The data sources 20224 may include additional or alternative data sources without departing from the scope of the disclosure. Once the user has defined the configuration of each respective market orchestration digital twin, where the configuration includes the selected states to be depicted and/or the granularity of each state, the user may then define the data sources 20224 that are fed into the respective market orchestration digital twin. In some embodiments, data from one or more of the data sources may be fused and/or analyzed before being fed into a respective digital twin.

In some embodiments, the user may select other types of market orchestration digital twins that are supported for the marketplace, including asset digital twins, environment digital twins, and/or process digital twins. In some of these embodiments, the user may define the data sources used to generate and/or update these digital twins. In embodiments, the user may define any physical locations to be represented as an environment digital twin. For example, the user may define trading floors, geofences, jurisdictions, manufacturing facilities (e.g., factories), asset locations (e.g., shipping facilities, warehouses, and the like), locations of business operation (e.g., office buildings), locations of consumer use, retail locations, and the like. Each may be given a location identifier and a name or other logical indicator. In embodiments, the marketplace configuration system 20302 may assign an identifier to each item and may associate the location of the item with the identifier. In embodiments, the user may define the types of objects that are included in an environment and/or may be found within the environment. For example, the user may define the types of machines (e.g., factory machines, robots, and the like) that are in the environment, the types of products that are made in, stored in, sold from, and/or received in the environment, the types of sensors/sensor kits that are used to monitor the environment, the types of networking or edge devices that are used in the environment, and the like.

In embodiments, the digital twin system 20208 is configured to generate, update, and serve market orchestration digital twins of a marketplace 20226. In some embodiments, the digital twin system 20208 is configured to generate and serve role-based digital twins on behalf of a marketplace and may serve the role-based digital twins to the marketplace participant user device 20218 (e.g., a mobile device, a tablet, a personal computer, a laptop, or the like). As discussed, during the configuration phase, a user may define the different types of data and the corresponding data sources and data sets that are used to generate and maintain each respective type among the different types of market orchestration digital twins. Initially, the digital twin system 20208 may configure the data structures that support each type of market orchestration digital twin, including any underlying databases or other data sources (e.g., SQL databases, distributed databases, graph databases, relational databases, object databases, blockchain-based databases, and the like) that store data that is ingested by the respective market orchestration digital twins. Once the data structures that support a digital twin are configured, the digital twin system 20208 receives data from one or more data sources 20224. In embodiments, the digital twin system 20208 may structure and/or store the received data in one or more databases. When a specific digital twin is requested (e.g., by a user via a client application 20312 or by a software component of the market orchestration system platform 20500), the digital twin system may determine the views that are represented in the requested digital twin and may generate the requested digital twin based on data from the configured databases and/or real-time data received via an API. The digital twin system 20208 may serve the requested digital twin to the requestor (e.g., the client application 20312 or a backend software component of the market orchestration system platform 20500). After a market orchestration digital twin is served, some market orchestration digital twins may be subsequently updated with real-time data received via the API system 20238.

In embodiments, the digital twin system 20208 may be further configured to perform simulations and modeling with respect to the market orchestration digital twins. In embodiments, the digital twin system 20208 is configured to run data simulations and/or environment simulations using a digital twin. For example, a user may, via a client device, instruct the digital twin system 20208 to perform a simulation with respect to one or more states depicted in a digital twin. The digital twin system 20208 may run the simulation on one or more items represented in the digital twin and may depict the results of the simulation in the digital twin. In this example, the digital twin may need to simulate at least some of the data used to run the simulation of the environment, so that there is reliable data when performing the requested environment simulation. The digital twin system 20208 is discussed in greater detail throughout the disclosure.

In embodiments, the exchange suite 20204 provides a set of various marketplace tools that may be leveraged by various users of a marketplace. The marketplace tools may include "in twin" collaboration tools (e.g., "in twin" video conferencing tools, "in-twin" chat services, and the like), an "in twin" strategies tool, an "in twin" trading practice tool, an "in twin" news tool, an "in twin" screener tool, an "in twin" market monitoring tool, an "in twin" entity profile tool, an "in twin" account management tool, an "in twin" charting tool, an "in twin" order request tool, and an "in twin" smart contract tool. In embodiments, an "in-twin" collaboration tool allows multiple users to view and collaborate within a digital twin. For example, multiple users may be granted access to view an asset digital twin representing a tractor available for lease in a marketplace via the in-twin collaboration tool. Once viewing the tractor digital twin, the users may then change one or more features of the tractor depicted in the tractor digital twin and/or may instruct the digital twin system to perform a simulation. In this example, the results of the simulation may be presented to the users in the digital twin. If the buyer is satisfied with the results of the simulation, he or she may generate a smart contract to lease the tractor via the "in twin" smart contract request tool. The "in twin" smart contract request tool may enable a user (e.g., the buyer) to define tractor leasing terms, which may include lease type (e.g., capital lease or operating lease), lease duration, financial terms, payment due to the lessor, market value of the equipment, tax responsibility, and cancellation provisions. Users may collaborate in additional manners with respect to a digital twin, as will be discussed throughout the disclosure. In some embodiments, the exchange suite 20204 interfaces with third-party applications, whereby data may be imported to and/or from the third-party application. For example, a first user (e.g., the buyer in a marketplace) may request certain information (e.g., additional photos or videos of an asset listed in the marketplace, sensor information (such as from one or more scanning systems), or the like) from a second user (e.g., the seller in the marketplace) via the market orchestration digital twin configured for the first user (e.g., the trader digital twin). In response, the second user may upload/export the requested data to the digital twin system 20208, which may then update the asset information in the trader digital twin configured for the first user. Additional examples and descriptions of the exchange suite 20204 and underlying collaboration tools are discussed throughout the disclosure.

In embodiments, the market orchestration system platform 20500 supports "in-twin" marketplaces. In embodiments, an in-twin marketplace may be accessible via visual market orchestration digital twins (e.g., marketplace digital twins, asset digital twins, trader digital twins, broker digital twins, and company digital twins). In embodiments, an in-twin marketplace may be accessible via visual digital twins of third-party organizations. In these embodiments, the visual digital twins may access the market orchestration system platform 20500 via an API and may allow users that are viewing the respective visual digital twins to participate in one or more marketplace transactions. In embodiments, users may issue a purchase offer for assets and/or services via a third-party digital twin (e.g., request to purchase an asset or service), purchase assets and/or services via the third-party digital twin (e.g., accepting an offer made by another party), view available transactions via the third-party digital twin, negotiate via the third-party digital twin, set proposed terms and conditions for a transaction (optionally including by smart contract configuration) in the digital twin, execute a transaction (such as by executing acceptance of a transaction, including one configured by a smart contract) in the digital twin, search for a transaction offer in the digital twin, place a transaction offer in the digital twin, search for a counterparty in the digital twin, search for an asset, asset type, asset class, or the like in the digital twin, view account information in the digital twin, and/or the like. In embodiments, a user's ability to view specific types of data within a digital twin and/or to engage in transactions on behalf of an organization is governed by the level of clearance of the user. In embodiments, a clearance of a user may include data access rights (e.g., whether the user can view detailed asset data of third-party assets that are involved in a marketplace and granted permissions (e.g., permissions to order items or services)). For example, with respect to a digital twin of a marketplace, an employee/user (e.g., manager) with sufficient clearance may have data access rights to view particular types of data, including the available inventory assets that may be used in transactions (such as or trades or as collateral) and to view the statuses of various assets. In this example, the manager may have permissions to undertake transactions for a defined subset of assets but cannot exceed that subset without authorization of a higher-ranking executive. In examples, with respect to a digital twin of a workflow, an employee/user (e.g., manager) may have access rights to view data obtained from entities involved in the workflow. The foregoing are examples of clearance levels of different types of employees defined with respect to specific types of digital twins. As can be appreciated, different clearance levels may be granted to different users depending on the role of the user, the data types that are available in a particular type of digital twin, and/or the types of marketplaces that are accessible via the digital twin. Furthermore, in some embodiments, some marketplaces are accessible via digital twins that do not require clearances or permissions. In these embodiments, any user can access the same types of data with a particular digital twin and engage in any type of transaction that is supported in the digital twin. For example, in a digital twin of a shopping mall, users (e.g., customers) can examine all the products within the shopping mall and can engage in transactions for those products.

In some embodiments, the market orchestration system platform 20500 includes an SDK where digital twin platforms can enable developers to incorporate specific marketplaces into a respective type of digital twin. In some of these embodiments, a digital twin (vis-à-vis the application presenting the digital twin) may be configured to access one or more features of one or more marketplaces by defining the marketplace(s) (e.g., via a URL or other mechanism) that are accessible from a respective view of the digital twin and defining the one or more features that are available when viewing the respective view the digital twin. In some embodiments, the digital twin may request marketplace data from the market orchestration system platform 20500, whereby the request may include parameters that the market orchestration system platform 20500 uses to identify the most relevant marketplace data, such as a type of data being presented in the digital twin and parameters that provide additional insight on which transactions to serve to the digital twin (e.g., product specifications, marketplace specifications, allowed and/or disallowed transaction partners, certification requirements, and/or the like). In response, the market orchestration system platform 20500 may identify relevant marketplace data (e.g., offers to sell relevant assets or services and/or providers of relevant assets or services that may receive offers to buy their respective assets or services) and may serve the relevant marketplace data to the digital twin. The digital twin may receive the marketplace data and may present the marketplace data in the digital twin (e.g., in proximity to the corresponding portion of the digital twin). The user may then initiate transactions via the marketplace using the marketplace data. For example, the user may initiate a purchase of an asset or service, may provide an offer to purchase an asset or service, may begin negotiations for an asset or service, or the like. Furthermore, as digital twin technology enables the execution of complex simulations, users may run simulations corresponding to real world environments and processes of an organization. In this way, a user may view predicted/simulated future states of the digital twin, which may be used to drive decisions with respect to a transaction. For example, in running simulations of different purchasing strategies, a user may view different simulated outcomes for different purchasing strategies (e.g., simulated outcomes from different combinations and sequences of purchases of tranches of various sizes) associated with an organization's purchasing processes (e.g., multi-market purchasing). In response to each different strategies, the digital twin may obtain and present marketplace data corresponding to each respective strategy, including vendors that provide goods or services that fulfill at least a portion of the strategy and, if available, offers from the vendors to provide goods or services (which may include pricing and additional data, such as timelines, certifications, licenses, and/or the like). In the absence of offers from a service provider, the user may be provided an interface to request a quote or to provide an offer to the service provider for the goods or services (as well as any requirements, such as timelines, certifications, licenses, and/or the like). In this way, the user may view the outcomes of the different strategies and then may initiate transactions to execute a selected strategy from the digital twin of the purchasing process.

In a non-limiting example of an in-twin marketplace, a digital twin of a manufacturing factory (or "factory twin") may depict, inter alia, the real-time inventory levels of all the parts used to manufacture goods, including raw materials (sheet metal, paints, or the like), single component parts (e.g., screws, springs, belts, chains, tires, or the like), and/or preassembled parts (e.g., engines/electric motors, struts, shocks, axles, infotainment systems, or the like) that are manufactured at different locations and/or purchased from third-parties and shipped to the factory. In this example, the digital twin may be configured to access a marketplace for ordering parts via an API of the market orchestration system platform 20500, where suppliers can offer to sell respective parts and/or receive offers to sell respective parts. In this example, the digital twin may be configured to provide a request to a specified marketplace (e.g., a part-supplies marketplace powered by the market orchestration system platform 20500) that indicates specifications for the parts (e.g., product type, product identifier, product dimensions, material types, required certifications, approved vendors, a number of units needed, and/or other suitable specifications), and the marketplace (e.g., via the market orchestration system platform 20500) may return transaction options for the parts (e.g., parts currently for sale by one or more different suppliers and/or different suppliers that produce the respective parts). In embodiments, a transaction option with respect to a respective supplier may indicate various attributes of the transaction option, such as a description of the parts made by the respective supplier, the amount of available parts from the respective supplier, the estimated shipping time of the parts from the respective supplier, a rating of the supplier, a price (e.g., total price and/or price-per-unit) for the part from the supplier (if an offer to sell), and/or other suitable attributes. In this way, a user with sufficient clearance to view existing inventory of a particular part and to order more inventory can view the existing inventory levels for the particular part and, if the inventory levels are low, may view transaction options for the particular part. The user may then initiate a transaction by selecting one or more of the transaction options. For example, the user may select an offer by a seller to sell a defined number of units at a predefined price or may generate an offer to buy a set number of units at a predefined price. It is noted that the offers to sell or buy may include additional information, such as proposed delivery dates, delivery types, product specifications, indemnifications, warranties, disclaimers, or other suitable information. Continuing this example, the user may leverage the digital twin to perform a simulation of the manufacturing process to determine when certain parts will likely need to be replenished given the factories' throughput, projected sales, predicted downtimes, and the like. In this way, the user can assess different transaction options to find the best available transaction given when a certain shipment of parts needs to be delivered by.

In embodiments, the statuses of individual pieces of equipment or other assets may be determined from sensor data derived from a set of sensors that are part of, affixed to, and/or proximate to the piece of equipment or asset. Furthermore, in some embodiments, the status of the equipment may be derived by running simulations. In embodiments, the status of the equipment may indicate to the viewer/user whether a piece of equipment currently requires service, is likely to require service, or is in working condition. In embodiments, the digital twin may be configured to automatically request transaction options from the market orchestration system platform 20500 in response to a determination that a piece of equipment requires service or may require service. In embodiments, a twin may generate a request that indicates information to obtain a transaction request, such as the location of the equipment or other asset, the type of equipment, the type of issue that needs to be resolved, and the like. In response, the market orchestration system platform 20500 identifies transaction requests that match or best correspond to the information provided in the request. For example, the market orchestration system platform 20500 may return transaction options from services/technicians that specialize in the type of machinery and/or type of issue. In this example, the twin may present the transaction options to the user in relation to the piece of equipment, whereby the user can initiate a transaction from the factory twin.

In embodiments, a marketplace orchestration digital twin may interact with a logistics digital twin. In one example, a logistics twin may present an option to sublease logistics space, such as warehouse space. In this example, the logistics twin may issue a request to the market orchestration system platform 20500 to generate an offer to sublease the warehouse space over a period of time via a specified marketplace. In response, the market orchestration system platform 20500 generates the offer and posts the offer on the specified marketplace. In a similar example, the device manufacturer may have shipped an additional ten containers that were presold prior to shipping. During transit, the purchaser reneges on the deal, thereby requiring temporary storage space. In this example, the marketplace digital twin may, based on information from a logistics twin or other logistics system, provide a warning to the user that an unsold shipment of ten containers is currently in transit to the United States without a storage plan in place. The twin may further request transaction options from the market orchestration system platform 20500, such as for temporary storage space, revision of delivery terms and conditions, modification of insurance, or the like, whereby the request may indicate information relevant to the same. In response, the market orchestration system platform 20500 may identify a set of transaction options for temporary warehouse space near the port of entry and may provide the transaction options to the twin. In response, the twin may present options to the user via the twin, whereby the user may select one or more of the transaction options. In this way, the user may resolve the issue in real-time, such as to ensure that the shipment of devices is stored upon arrival in a cost-effective manner.

In embodiments, the market orchestration system platform 20500 supports in-twin smart contracts. In-twin smart contracts may refer to smart contracts that can be accessed and committed to via a digital twin, that share data structures with a digital twin, that can be parameterized by data of a digital twin system, that can be presented and/or configured within a digital twin, that are integrated with workflows of a digital twin, or the like. In these embodiments, transaction options may be presented to a user via a digital twin, where one or more of the transaction options are associated with a respective smart contract. In these embodiments, the user may commit to a transaction via the digital twin. For example, the user may select a user interface element within the digital twin that commits the user to the transaction. In response to the user selection, the market orchestration system platform 20500 may commit the user to the smart contract. In some embodiments, the market orchestration system platform 20500 may commit the user to a smart contract by parameterizing the smart contract with information obtained from the user. For instance, the market orchestration system platform 20500 may provide an identifier of the party, an amount/type of currency in the transaction, and any other required information (e.g., a location for a delivery or service to be performed, a delivery date/contract expiration date/completion date, a start date, and/or the like).

In embodiments, the market orchestration system platform 20500 trains and deploys intelligent agents on behalf of marketplace users. In embodiments, an intelligent agent is an AI-based software system, such employing robotic process automation, such as in the form of a bot, that performs tasks on behalf of and/or suggests actions to a respective user having a defined marketplace role. In embodiments, the intelligent agent may be trained by the market orchestration system platform 20500 based on interactions of the user with a client application 20312, such as actions taken by a user with respect to a market orchestration digital twin, interactions with sensor data or other data collected by the market orchestration system platform 20500, interactions with one or more software systems that performs or enables a marketplace related task (such as a trading system, an analytic system, a pricing system, a smart contract configuration system, a template-based contracting system, a payments system, an ordering system, an e-commerce system, a cryptocurrency system, a wallet, a register or other point-of-sale system, a fulfillment system, and many others), interactions with hardware or physical systems, and the like. Training may be unsupervised training (such as based on outcome data using a wide variety of feedback metrics, such as outcome data showing profitability of trading activities, purchasing activities, lending activities, selling activities, and many others), supervised training, or semi-supervised training. In embodiments, an intelligent agent may be a trader agent trained for trader roles and workflows, such as identifying favorable trading strategies or trade opportunities (such as arbitrage opportunities), placing bids, accepting bids, configuring and/or negotiating a contract (such as a smart contract), setting trade sizes, and setting orders (including limit orders, call orders, position covering orders, hedge-based orders and many others), including any of the roles and workflows described herein or in the documents incorporated herein by reference. In embodiments, an intelligent agent may be a buyer agent trained for buyer roles and workflows, such as identifying buying opportunities within an asset class, determining a set of orders required to satisfy a strategic rule or criterion (such as an asset allocation criterion), negotiating terms and conditions of a contract (such as a smart contract, such as relating to price, quantity, timing, delivery terms, insurance coverage, warranties, and many others), finding and/or executing undervalued items, bargains, or the like, and many others, including any of the roles and workflows described herein or in the documents incorporated herein by reference. In embodiments, an intelligent agent may be a seller agent trained for seller roles and workflows, such as identifying prospective buyers, configuring contract terms and conditions (such as for smart contracts, such as auction rules, prices, offer size, offer timing, offer volume, promotions, incentives, discounts (e.g., based on volume or timing), delivery terms, fulfillment terms, maintenance and update terms, warranty and liability terms, insurance coverage, and many others), including any of the roles and workflows described herein or in the documents incorporated herein by reference. In embodiments, an intelligent agent may be a broker agent trained for broker roles, such as identifying sellers, identifying buyers, matching buyers to sellers, negotiating commissions and other contractual terms and conditions (such as in smart contracts), identifying service providers, and many others, including any of the broker roles and workflows described herein or in the documents incorporated herein by reference. In embodiments, an intelligent agent may be a marketplace host agent trained for marketplace host roles, such as setting marketplace participation rules, setting rules for configuration of transactions (such as auction rules, bid/ask rules, order types, asset types, and many others), configuring and/or negotiating contracts for marketplace participation (such as smart contracts, such as contracts governing permitted trading activities, permitted participants, and others), setting exchange rates, setting and/or configuring media of exchange (such as fiat or cryptocurrencies, tokens, points, and others), and many others, including any of the host roles and workflows described herein or in the documents incorporated herein by reference. In embodiments, the market orchestration system platform 20500 trains intelligent agents 20234 for other roles within a marketplace, such as a valuation role, an analyst role, a delivery role, an asset inspection role, and the like.

In embodiments, the market orchestration system platform 20500 trains intelligent agents 20234 based on training data that includes actions taken by users and features relating to the circumstances surrounding the action (e.g., the type of action taken, the scenario that prompted the action, and the like). In embodiments, the market orchestration system platform 20500 receives telemetry data from a client application 20312 associated with a particular user and learns the workflows performed by the particular user based on the telemetry data and the surrounding circumstances. For example, the user may be a buyer in a marketplace that is presented an asset digital twin. Among the actions of the buyer may be to run simulations on asset digital twins wherein the asset digital twins represent assets for sale in the marketplace. The states depicted in the asset digital twin may include the condition of the asset digital twin as a result of one or more simulations. In this example, the buyer may buy the asset via the asset digital twin when the asset digital twin is determined to be in a first condition (e.g., a good condition) as a result of one or more simulations and may decline to purchase the asset and search for other assets for sale when the asset digital twin is determined to be in a second condition (e.g., a critical condition) as the result of one or more simulations. The intelligent agent may be trained to identify the buyer's tendencies based on the buyer's previous interaction with the asset digital twin. Once trained, the intelligent agent may automatically buy assets for sale when a particular asset's digital twin is determined to be in the first condition as the result of one or more simulations and may automatically decline to buy the asset and search for other assets if the asset digital twin is in the second condition as the result of one or more simulations. In embodiments, simulations may be based upon and/or incorporate behavioral models that predict behavior of assets (such as physical models that predict physical conditions (such as based on physical, chemical and biological principles), economic models that predict economic behavior (such as models that predict behavior of purchasers, sellers, prices, trading patterns, or the like), human behavioral models (such as psychological models, demographic models, population models, sociological models, game-theoretic models, and many others)), and many others, including any of the models described herein or in the documents incorporated herein by reference and including hybrids and combinations of the foregoing. As one example among many possible models, in a marketplace for wine (or other asset that can improve or deteriorate over time), a simulation may include a physical model that uses sensor data from a storage environment for a unit, a chemical model that predicts the effects of the passage of time under the sensed storage conditions, and an economic model that predicts the value of a unit of a given level of quality based on historical pricing patterns for similar goods. The results may yield an expected value of the asset, as well as a simulation of the price of the asset at different points of time, which an intelligent agent may use as reference information in comparison to a current price and/or a predicted future price, such as to determine automatically (after training upon a set of interactions of users with similar comparisons) whether to hold, buy, or sell. While reference is made to an intelligent agent being trained for a particular user, it is understood that an intelligent agent may be trained using the actions of one or more different users and may be used in connection with users that were not involved in training the intelligent agent. Further discussion of intelligent agents is provided throughout the disclosure.

In embodiments, the intelligent agent system 20210 trains intelligent agents 20234 that perform/recommend actions on behalf of a user. An intelligent agent may be a software module that implements and/or leverages artificial intelligence services to perform/recommend actions on behalf of or in lieu of a user. In embodiments, an intelligent agent may use, link to, integrate with, and/or include one or more machine-learned systems or models (e.g., neural networks, prediction models, classification models, Bayesian models, Gaussian models, decision trees, random forests, and the like, including any described herein or incorporated herein by reference) that perform machine-learning tasks in connection with a defined role. Additionally or alternatively, an intelligent agent may be configured with artificial intelligence rules that determine actions in connection with a defined role. The artificial intelligence rules may be programmed by a user or may be generated by the intelligent agent system 20210. An intelligent agent may be executed at the marketplace participant user device 20218 and/or may be executed by the market orchestration system platform 20500. In the latter embodiments, the intelligent agent may be accessed as a service (e.g., via an API). In embodiments, where an intelligent agent is at least partially executed at a client device, the market orchestration system platform 20500 may train an intelligent agent and may serve the trained intelligent agent to a client application 20312. In embodiments, an intelligent agent may be implemented as a container (e.g., a Docker container) that may execute at the client device 20340 or at the market orchestration system platform 20500. In embodiments, the intelligent agent is further configured to collect and report data to the intelligent agent system 20210, which the intelligent agent system 20210 uses to train/reinforce/reconfigure the intelligent agent. In embodiments, the intelligent agent is integrated into or with a marketplace orchestration digital twin system, such as involving a shared set of data resources, a shared set of computational resources, a shared set of artificial intelligence resources, a shared data schema, a shared user interface, a shared set of workflows, a shared set of applications or services, or the like. In embodiments, integration is within a shared microservices architecture, where intelligent agent services and digital twin services are managed within a common microservices framework.

In some embodiments, the intelligent agent system 20210 (working in connection with the intelligent services system 20243) may train intelligent agents 20234 (e.g., trader agents, buyer agents, seller agents, broker agents, marketplace host agents, regulatory agents, and other intelligent agents) using robotic process automation techniques to perform one or more executive actions on behalf of respective agents. In some of these embodiments, a client application 20312 may execute on the marketplace participant user device 20218 (e.g., a user device, such as a tablet, a VR headset, a mobile device, or a laptop, an embedded device, or the like) associated with a user (e.g., a buyer, a seller, a broker, a role-based expert, a marketplace host, or any other suitable affiliate). In embodiments, the client application 20312 may record the interactions of a user with the client application 20312 and may report the interactions to the intelligent agent system 20210. In these embodiments, the client application 20312 may further record and report features relating to the interaction, such as any stimuli or sets of stimuli that were presented to the user, what the user was viewing at the time of the interaction, the type of interaction, the role of the user, the role of the individual that requested the interaction, and the like. The intelligent agent system 20210 may receive the interaction data and related features and may train an intelligent agent based thereon. In embodiments, the interactions may be interactions by the user with a market orchestration digital twin (e.g., an asset digital twin, a trader digital twin, a broker digital twin, a marketplace digital twin, an environment digital twin, a process digital twin, and the like). In embodiments, the interactions may be interactions by the user with sensor data (e.g., vibration data, temperature data, pressure data, humidity data, radiation data, electromagnetic radiation data, motion data, and/or the like) and/or data streams collected form physical entities (e.g., machinery, a building, a shipping container, or the like). For example, a user may be presented with sensor data from a particular piece of equipment and, in response, may determine that a smart contract request action be taken with respect to the piece of equipment. In this example, the intelligent agent may be trained on the conditions that cause the user to generate a smart contract to sell an asset as well as instances where the user did not generate a contract to sell an asset. In this example, the intelligent agent may learn the circumstances in which a smart contract request action is taken. In embodiments, the intelligent agent system 20210 may train intelligent agents based on user interactions with other marketplace entities (such as network entities and computation entities). For example, the intelligent agent system 20210 may train an intelligent agent to learn the manner by which a trader identifies and engages with a counterparty. In this example, the intelligent agent may be trained to learn the steps undertaken by the trader to identify a counterparty, engage with the counterparty, and any actions undertaken by the trader to pursue a transaction with a counterparty.

In embodiments, an intelligent agent may be implemented as a robot that performs asset inspection actions, asset retrieval actions, payment actions, asset delivery actions, asset servicing actions, asset testing actions, asset valuation actions, asset testing actions, and the like.

In embodiments, the types of actions that an intelligent agent may be trained to perform/recommend include: selection of an asset, pricing of an asset, listing an asset in a marketplace, uploading information related to an asset, identifying counterparties, selecting counterparties, identifying opportunities, selecting opportunities, identifying marketplaces, digitally inspecting an asset, physically inspecting an asset, physically delivering an asset, physically retrieving an asset, configuring a marketplace, configuring a digital twin, placing an order request, generating a smart contract, order matching, selection of a strategy, selection of a task, setting of a parameter, selection of an object, selection of a workflow, triggering of a workflow, ordering of a product, ordering of a process, ordering of a workflow, cessation of a workflow, selection of a data set, selection of a design choice, creation of a set of design choices, identification of a problem, selection of a human resource, providing an instruction to a human resource, amongst other possible types of actions. In embodiments, an intelligent agent may be trained to perform other types of tasks, such as: reporting on an asset, reporting on a counterparty, reporting on a trader, reporting on a status, reporting on an event, reporting on a context, reporting on a condition, reporting on a transaction, determining a model, configuring a model, populating a model, designing a system, engineering a product, maintaining a system, maintaining a device, maintaining a process, maintaining a network, maintaining a computational resource, maintaining equipment, maintaining hardware, repairing a system, repairing a device, repairing a network, repairing a computational resource, repairing equipment, repairing hardware, assembling a system, assembling a device, assembling a process, assembling a network, assembling a computational resource, assembling equipment, assembling hardware, setting a price, physically securing a system, physically securing a device, physically securing a process, physically securing a network, physically securing a computational resource, physically securing equipment, physically securing hardware, cyber-securing a system, cyber-securing a device, cyber-securing a process, cyber-securing a network, cyber-securing a computational resource, cyber-securing equipment, cyber-securing hardware, detecting a threat, detecting a fault, tuning a system, tuning a device, tuning a process, tuning a network, tuning a computational resource, tuning equipment, tuning hardware, optimizing a system, optimizing a device, optimizing a process, optimizing a network, optimizing a computational resource, optimizing equipment, optimizing hardware, monitoring a system, monitoring a device, monitoring a process, monitoring a network, monitoring a computational resource, monitoring equipment, monitoring hardware, configuring a system, configuring a device, configuring a process, configuring a network, configuring a computational resource, configuring equipment, configuring hardware, monitoring technology, replications and partitioning of data, index creation on underlying databases, alteration of runtime parameters, allocation of additional CPU, memory, and disk in virtual environments and physical environments, allocation of additional market orchestration engines, clustering of environments, distribution of environments, coordination of environments between physical locations, monitoring of the dark web, management of regulatory interfaces, management and extension of third party interfaces, geographic setup of local markets, management of remote administration tooling, building of serverless components, alternative front end trading tooling (embedded clients, alternative platforms, SMS trading tools, phone trading tools), and the like.

As discussed, an intelligent agent is configured to determine an action and may output the action to a client application 20312. Examples of an output of an intelligent agent may include a recommendation, a classification, a prediction, a control instruction, an input selection, a protocol selection, a communication, an alert, a target selection for a communication, a data storage selection, a computational selection, a configuration, an event detection, a forecast, and the like. Furthermore, in some embodiments, the intelligent agent system 20210 may train intelligent agents 20234 to provide training and/or guidance rather in addition to or in lieu of outputting an action. In these embodiments, the training and/or guidance may be specific for a particular individual or role or may be used for other individuals.

In embodiments, the intelligent agent system 20210 is configured to provide benefits to experts that participate in the training of intelligent agents 20234. In some embodiments, the benefit is a reward that is provided based on the outcomes stemming from the user of an intelligent agent trained by the expert user. In some embodiments, the benefit is a reward that is provided based on the productivity of the intelligent agent. In some embodiments, the benefit is a reward that is provided based on a measure of expertise of the intelligent agent. In some embodiments, the benefit is a share of the revenue or profit generated by the work produced by the intelligent agent. In some embodiments, the benefit is tracked using a distributed ledger (e.g., a blockchain) that captures information associated with a set of actions and events involving the intelligent agent. In some of these embodiments, a smart contract may govern the administration of the reward to the expert user.

In some embodiments, the intelligent agent system 20210 and/or a client application 20312 can monitor outcomes related to the user's interactions and may reinforce the training of the intelligent agent based on the outcomes. For example, each time the user performs a buying action, the intelligent agent system 20210 may determine the outcome (e.g., whether the outcome is a positive outcome or a negative outcome). The intelligent agent system 20210 may then retrain the intelligent agent based on the outcome. Examples of outcomes may include data relating to at least one of a financial outcome, a profitability outcome, an operational outcome, an order cancellation outcome, a fault outcome, a success outcome, a performance indicator outcome, an output outcome, a consumption outcome, an energy utilization outcome, a resource utilization outcome, a behavioral outcome (such as attention behavior, mobility behavior, purchasing behavior, selling behavior, or others), a cost outcome, a profit outcome, a revenue outcome, a sales outcome, a warranty claim outcome, an insurance claim outcome, a lending outcome (e.g., a default or repayment outcome), a collateralization outcome, and a production outcome. In these embodiments, the intelligent agent system 20210 may monitor data obtained from the various data sources after an action is taken to determine an outcome (e.g., profit increased/decreased and by how much, purchased asset condition, purchased asset performance, whether desired counterparty behavior was induced, and the like). The intelligent agent system 20210 may include the outcome in the training data set associated with the action undertaken by the user that resulted in the outcome.

In some embodiments, the intelligent agent system 20210 receives feedback from users regarding respective intelligent agents 20234. For example, in some embodiments, a client application 20312 that leverages an intelligent agent may provide an interface by which a user can provide feedback regarding an action output by an intelligent agent. In embodiments, the user provides the feedback that identifies and characterizes any errors by the intelligent agent. In some of these embodiments, a report may be generated (e.g., by the client application 20312 or the market orchestration system platform 20500) that indicates the set of errors encountered by the user. The report may be used to reconfigure/retrain the intelligent agent. In embodiments, the reconfiguring/retraining of an intelligent agent may include removing an input that is the source of the error, reconfiguring a set of nodes of the artificial intelligence system, reconfiguring a set of weights of the artificial intelligence system, reconfiguring a set of outputs of the artificial intelligence system, reconfiguring a processing flow within the artificial intelligence system (such as placing gates on a recurrent neural network to render it a gated RNN that balances learning with the need to diminish certain inputs in order to avoid exploding error problems), reengineering the type of the artificial intelligence system (such as by modifying the neural network type among a convolutional neural network, a recurrent neural network, a feed forward neural network, a long-term/short-term memory (LSTM) neural network, a self-organizing neural network, or many other types and combinations), and/or augmenting the set of inputs to the artificial intelligence system.

In embodiments, the intelligent agent may be configured to, at least partially, operate as a double of the user having a role within a marketplace. In these embodiments, the intelligent agent system 20210 trains an intelligent agent based on a training data set that includes a set of interactions by a specific user during the performance of their respective role within the marketplace. For example, the set of interactions that may be used to train the intelligent agent may include interactions of the user with the entities of a marketplace, interactions of the user with other users of the marketplace, interactions of the user with assets listed in the marketplace, interactions of the user with a digital twin, interactions of the user with sensor data obtained from a sensor system, interactions of the user with data streams generated by physical entities, interactions of the user with the computational entities of the marketplace, and the like. In some embodiments, the intelligent agent system 20210 parses the training data set of interactions to identify a chain of reasoning of the user upon a set of interactions. In some of these embodiments, the chain of reasoning may be parsed to identify a type of reasoning of the user, which may be used as a basis for configuring/training the intelligent agent. For example, the chain of reasoning may be a deductive chain of reasoning, an inductive chain of reasoning, a predictive chain of reasoning, a classification chain of reasoning, an iterative chain of reasoning, a trial-and-error chain of reasoning, a Bayesian chain of reasoning, a scientific method chain of reasoning, and the like. In some embodiments, the intelligent agent system 20210 parses the training data set of interactions to identify a type of processing undertaking by the user in analyzing the set of interactions. For example, types of processing may include audio processing in analyzing audible information, tactile or "touch" processing in analyzing physical sensor information, textual information processing in analyzing text, motion processing in analyzing motion information, visual processing in analyzing visual information, spatiotemporal processing in processing spatiotemporal information, mathematical processing in mathematically operating on numerical data, creative processing when deriving alternative options, analytic processing when selecting from a set of options, and the like. In embodiments, identification of a type of reasoning and/or a type of processing may be informed by undertaking brain imaging, such as functional MRI or other magnetic imaging, electroencephalogram (EEG), or other imaging, such as by identifying broad brain activity (e.g., wave bands of activity, such as delta, theta, alpha and gamma waves), by identifying a set of brain regions that are activated and/or inactive during the set interactions of the user that are being used for training of the intelligent agent (such as neocortex regions, such as Fp1 (involved in judgment and decision making), F7 (involved in imagination and mimicry), F3 (involved in analytic deduction), T3 (involved in speech), C3 (involved in storage of facts), T5 (involved in mediation and empathy), P3 (involved in tactical navigation), O1 (involved in visual engineering), Fp2 (involved in process management), F8 (involved in belief systems), F4 (involved in expert classification), T4 (involved in listening and intuition), C4 (involved in artistic creativity), T6 (involved in prediction), P4 (involved in strategic gaming), O2 (involved in abstraction), and/or combinations of the foregoing) or by other neuroscientific, psychological, or similar techniques that provide insight into how humans upon which the intelligent agent is trained are solving particular types of problems that are involved in workflows for which intelligent agents are deployed. In embodiments, an intelligent agent may be configured with a neural network type, or combination of types, that is selected to replicate or simulate a processing activity that is similar to the activity of the brain regions of a human expert that is performing a set of activities for which the intelligent agent is to be trained. As one example among many possible, a trader may be shown to use visual processing region O1 and strategic gaming region P4 of the neocortex when making successful trades, and a neural network may be configured with a convolutional neural network to provide effective replication of visual pattern recognition and a gated recurrent neural network to replicate strategic gaming. In embodiments, a library of neural network resources representing combinations of neural network types that mimic or simulate neocortex activities may be configured to allow selection and implementation of modules that replicate the combinations used by human experts to undertake various activities that are subjects of development of intelligent agents, such as involving robotic process automation. In embodiments, various neural network types from the library may be configured in series and/or in parallel configurations to represent processing flows, which may be arranged to mimic or replicate flows of processing in the brain, such as based on spatiotemporal imaging of the brain when involved in the activity that is the subject of automation. In embodiments, an intelligent software agent for agent development may be trained, such as using any of the training techniques described herein, to select a set of neural network resource types, to arrange the neural network resource types according to a processing flow, to configure input data sources for the set of neural network resources, and/or to automatically deploy the set of neural network types on available computational resources to initiate training of the configured set of neural network resources to perform a desired intelligent agent/automation workflows. In embodiments, the intelligent software agent used for agent development operates on an input data set of spatiotemporal imaging data of a human brain, such as an expert who is performing the workflows, and uses the spatiotemporal imaging data to automatically select and configure the selection and arrangement of the set of neural network types to initiate learning. Thus, a system for developing an intelligent agent may be configured for (optionally automatic) selection of neural network types and/or arrangements based on spatiotemporal neocortical activity patterns of human users involved in workflows for which the agent is trained. Once developed, the resulting intelligent agent/process automation system may be trained as described throughout this disclosure.

In embodiments, a system for developing an intelligent agent 20234 (including the aforementioned agent for development of intelligent agents) may use information from brain imaging of human users to infer (optionally automatically) what data sources should be selected as inputs for an intelligent agent. For example, for processes where neocortex region O1 is highly active (involving visual processing), visual inputs (such as available information from cameras, or visual representations of information like price patterns, among many others) may be selected as favorable data sources. Similarly, for processes involving region C3 (involving storage and retrieval of facts), data sources providing reliable factual information (such as blockchain-based distributed ledgers) may be selected. Thus, a system for developing an intelligent agent may be configured for (optionally automatic) selection of input data types and sources based on spatiotemporal neocortical activity patterns of human users involved in workflows for which the agent is trained.

In embodiments, the intelligent agents 20234 are trained to output actions on behalf of a trader, a buyer, a seller, a broker, a marketplace host and/or an affiliate of a buyer, a seller, a broker, or marketplace host. In these embodiments, an intelligent agent may be trained for marketplace roles, such that a user in a particular marketplace role can train the intelligent agent by performing their respective role. For example, an intelligent agent may be trained for performing actions on behalf of or recommending actions to a user in a particular role within a marketplace. In some of these embodiments, the client application 20312 may provide the functionality of the market orchestration system platform 20500. For example, in some embodiments, users may view market orchestration digital twins and/or may use the exchange suite tools via the client application 20312. During the use of the client application 20312, a buyer may use a screener tool to filter assets by setting criteria via the graphical user interface. Each time the user interacts with the client application 20312, the client application 20312 may monitor the user's actions and may report the actions back to the intelligent agent system 20210. Over time, the intelligent agent system 20210 may learn how the particular user responds to certain situations. For instance, if the user is the seller and each time the price of an asset is within a specific range, the seller places an order request to sell assets, the intelligent agent system 20210 may learn to automatically sell assets when pricing for those assets is within the specific range. Further implementations of the intelligent agent system 20210 are discussed further in the disclosure.

In embodiments, the market orchestration system platform 20500 includes the marketplace databases 20216 that store data on behalf of marketplaces. In embodiments, each marketplace may have an associated data lake that receives data from various data sources 20224, an associated set of blockchains that store transactional data, such as in a set of distributed ledgers, or the like. In some embodiments, the marketplace databases 20216 receive the data via one or more API Systems 20238. For example, in embodiments, the API may be configured to obtain real-time sensor data from one or more sensor systems 20274. The sensor data may be collected in a data lake, a set of blockchains, or the like associated with the marketplace. The digital twin system 20208 and the intelligent services system 20243 may structure the data in the data resources and may populate one or more respective market orchestration digital twins based on the collected data. In some embodiments, the data sources 20224 may include an edge device 20292 that collects sensor data from the sensor system 20274 and/or other suitable IoT devices. In some of these embodiments, the edge devices 20292 may be configured to process sensor data (or other suitable data) collected at a "network edge" of the enterprise. Edge processing of enterprise data may include sensor fusion, data compression, data structuring, and/or the like. In some embodiments, the edge device 20292 may be configured to analyze the collected sensor data and to adjust a sensor data stream based on the contents of the collected sensor data. For example, an edge device 20292 may stream sensor data that is considered anomalous without compression and may compress and stream sensor data that is considered to be within a tolerance range. In this way, the edge device 20292 may provide semi-sentient data streams. In embodiments, the market orchestration system platform 20500 may store the data streams in the data lake and/or may update one or more market orchestration digital twins with some or all of the received data.

In embodiments, the marketplace participant user device 20218 may execute one or more client applications 20312 that interface with the market orchestration system platform 20500. In embodiments, a client application 20312 may request and display one or more market orchestration digital twins. In some of these embodiments, a client application 20312 may depict a market orchestration digital twin corresponding to the role of the user. For example, if the user is a trader, the market orchestration system platform 20500 may provide a trader digital twin to the user. In some of these embodiments, the user data stored at the market orchestration system platform 20500 and/or the client device may indicate the role of the user and/or the types of market orchestration digital twins the user has access to.

In embodiments, the client application 20312 may display the requested market orchestration digital twin and may provide one or more options to perform one or more respective operations corresponding to the market orchestration digital twin and the states depicted therein. In embodiments, the operations may include one or more of "drilling down" into a particular state, exporting a state or set of states into collaborative documents (e.g., into a word processor document, a spreadsheet, a PowerPoint document, an annual report, or the like), performing a simulation, inspecting an asset, or the like. For example, a marketplace host may view a marketplace host digital twin. Amongst the states that may be depicted in the marketplace host digital twin may include notifications of potential issues with marketplace performance. In viewing the marketplace host digital twin, the user may wish to "drill down" into marketplace performance information. In this example, the client application 20312 depicting the marketplace host digital twin may allow the user to view higher granularity marketplace performance information, including execution speed, percentage of orders price improved, net improvement per order, liquidity multiple, and the like.

Referring to FIG. 208, in embodiments, the digital twin system 20208 is executed by a computing system (e.g., one or more servers) that may include a processing system 20802 that includes one or more processors, a storage system 20834 that includes one or more computer-readable mediums, and a network interface 20860 that includes one or more communication units that communicate with a network (e.g., the Internet, a private network, and the like). In embodiments, a processing system 20802 may execute one or more of a digital twin configuration system 20810, digital twin I/O system 20812, a data structuring system 20814, a digital twin generation system 20818, a digital twin perspective builder 20820, a digital twin access controller 20822, a digital twin interaction manager 20824, an environment simulation system 20828, a data simulation system 20830, a digital twin notification system 20832, and a digital twin simulation system 20804. The processing system 20802 may execute additional or alternative components without departing from the scope of the disclosure. In embodiments, the storage system 20834 may store marketplace data, such as a marketplace data lake 20858, a digital twin data store 20838, and/or a behavior datastore 20840. The storage system 20834 may store additional or alternative data stores without departing from the scope of the disclosure. In embodiments, the digital twin system 20208 may interface with the other components of the market orchestration system platform 20500, such as the marketplace configuration system 20302, the exchange suite 20204, the intelligent agent system 20210, and/or the intelligent services system 20243.

In embodiments, the digital twin configuration system 20810 is configured to set up and manage the market orchestration digital twins and associated metadata of market orchestration digital twins and to configure the data structures and data listening threads that power the market orchestration digital twins. In embodiments, the digital twin configuration system 20810 receives the types of digital twins that will be supported for the marketplace, as well as the different states/objects that will be depicted in each type of digital twin. For each type of digital twin, the digital twin configuration system 20810 identifies the types of data that feed or otherwise support each state that is depicted in the respective type of digital twin and may determine any internal or external software requests that are required to support the identified data types. In some embodiments, the digital twin configuration system 20810 determines internal and/or external software requests that support the identified data types by analyzing the relationships between the different types of data that correspond to a particular state/granularity. In embodiments, the digital twin configuration system 20810 determines and manages the data structures needed to support each type of digital twin. For example, for an asset digital twin representing real estate listed in a marketplace, the digital twin configuration system 20810 may instantiate a database (e.g., a graph database that defines the ontology of the property and the objects existing (or potentially existing) within the property and the relationships therebetween), whereby the instantiated database contains and/or references the underlying data that powers the real estate digital twin (e.g., sensor data and analytics, 3D maps, physical asset twins, and the like). In some embodiments, the different types of market orchestration digital twins may be configured in accordance with a set of preference settings and taxonomy settings. In some embodiments, the digital twin configuration system 20810 may utilize pre-defined preferences (e.g., default preference templates for different types of market orchestration digital twins) and taxonomies (e.g., default taxonomies for different types of market orchestration digital twins) and/or receive custom preference settings and taxonomies from a configuring user. Examples of role-specific templates that are used to configure a role-based digital twin may include a trader template, a broker template, and a marketplace host template. Similarly, examples of taxonomies that are used to configure different types of role-based digital twins may include a trader taxonomy, a broker taxonomy, and a marketplace host taxonomy.

In embodiments, the digital twin configuration system 20810 may configure the databases that support each respective market orchestration digital twin (e.g., role-based digital twins, asset digital twins, market orchestration digital twins, and the like), which may be stored on the digital twin data store 20838. In embodiments, for each database configuration, the digital twin configuration system 20810 may identify and connect any external resources needed to collect data for each respective data type. For example, in order to collect data from one or more edge devices 20292, the configuration system 20810 may initiate a process of granting access to the edge devices 20292 to the APIs of the market orchestration system platform 20500.

In embodiments, the digital twin I/O system 20812 is configured to obtain data from a set of data sources. In some embodiments, the digital twin I/O system 20812 (or other suitable components) may provide a graphical user interface that allows a user affiliated with a marketplace to upload various types of data that may be leveraged to generate the market orchestration digital twins. For example, the user may upload 3D scans, images, LIDAR scans, blueprints, 3D floor plans, object types (e.g., products, sensors, machinery, furniture, and the like), object properties (e.g., materials, physical properties, descriptions, price, and the like), output type (e.g., sensor units), and the like. In embodiments, the digital twin I/O system 20812 may subscribe to or otherwise automatically receive data streams (e.g., publicly available data streams, such as RSS feeds, sensor system streams, and the like) on behalf of a marketplace or marketplace entities. Additionally or alternatively, the digital twin I/O system 20812 may periodically query and/or receive data from a connected data source, such as the sensor system 20274 having sensors that sensor data from facilities (e.g., manufacturing facilities, shipping facilities, agricultural facilities, resource extraction facilities, computing facilities, and the like), and/or other physical entities, financial databases, surveys, third-party data sources, and/or third party datastores that store third party data, and edge devices 20292 that report data relating to physical assets (e.g., smart machinery/manufacturing equipment, sensor kits, autonomous vehicles, wearable devices, and the like). In embodiments, the digital twin I/O system 20812 may employ a set of web crawlers to obtain data. In embodiments, the digital twin I/O system 20812 may include listening threads that listen for new data from a respective data source.

In some embodiments, the digital twin I/O system 20812 is configured to serve the obtained data to instances of market orchestration digital twins (which is used to populate digital twins) that are executed by a client device or the market orchestration system platform 20500. In embodiments, the digital twin I/O system 20812 receives data stream feeds and/or collects on behalf in a marketplace and stores at least a portion of the streams into a data lake or other data resource associated with the marketplace.

In embodiments, the data structuring system 20814 builds data into a format and grain that can be consumed by a market orchestration digital twin. In embodiments, the data structuring system 20814 may leverage ETL (extract, transform, load) tools, data streaming, and other data integration tooling to structure the data. In embodiments, the data structuring system 20814 structures the data according to a digital twin data model that may be defined by the digital twin configuration system 20810 and/or a user. A data model may refer to an abstract model that organizes elements of marketplace-related data and standardizes the manner by which those elements relate to one another and to the properties of digital twin entities. For instance, a digital twin data model of a vehicle fleet (e.g., a vehicle fleet listed in a marketplace) may specify that the data element representing a vehicle be composed of a number of other elements which represent sub-elements or attributes of the vehicle (the color of the vehicle, the dimensions of the vehicle, the engine of the vehicle, the engine parts of the vehicle, the owner of the vehicle, and the like). In this example, the digital twin model components may define how the physical attributes are tied to respective physical locations on the vehicle. In embodiments, a digital twin model may define a formalization of the objects and relationships found in a particular application domain. For example, a digital twin model may represent the asset components and how they relate to each other within the various digital twins. Additionally or alternatively, a digital twin data model may define a set of concepts (e.g., entities, attributes, relations, tables, and/or the like) used in defining such formalizations of data or metadata. For example, a "digital twin data model" used in connection with a banking application may be defined using the entity-relationship "data model" and how it is then related to the various market orchestration digital twin views.

In embodiments, the digital twin generation system 20818 serves market orchestration digital twins. In some instances, the digital twin generation system 20818 receives a request for a specific type of digital twin from a client application 20312 being executed by the marketplace participant user device 20218 (e.g., via an API). Additionally or alternatively, the digital twin generation system 20818 receives a request for a specific type of digital twin from a component of the market orchestration system platform 20500 (e.g., the digital twin simulation system 20804). The request may indicate the marketplace, the type of digital twin, and the user (whose access rights may be verified or determined by the digital twin access controller 20822). In some embodiments, the digital twin generation system 20818 may determine and provide the client device 20340 with the data structures, metadata, ontology, and information on hooks to data feeds as well as the digital twin constructs. This information may be used by the client to generate the digital twin in the end user device (e.g., an immersive device, such as AR devices or VR devices, tablet, personal computer, mobile, or the like). In embodiments, the digital twin system 20208 may determine the appropriate perspective for the requested digital twin (e.g., via the perspective builder 20820), any data restrictions that the user may have (e.g., via the digital twin access controller 20822), and in response to the perspective and data restrictions, may generate the requested digital twin. In some embodiments, generating the requested digital twin may include identifying the appropriate data structure given the perspective and obtaining the data that parameterizes the digital twin, as well as any additional metadata that is served with the market orchestration digital twin.

In embodiments, the digital twin generation system 20818 may deliver the market orchestration digital twin to the requesting client application 20312. In embodiments, the digital twin generation system 20818 (or another suitable component) may continue to update a served digital twin with real-time data (or data that is derived from real-time data) as the real-time data is received and potentially analyzed, extrapolated, derived, predicted, and/or simulated by the market orchestration system platform 20500.

In some embodiments, the digital twin generation system 20818 may obtain data streams from various data sources, such as relational databases, object-oriented databases, distributed databases, blockchains, Hadoop file stores, graph databases, and the like that underlie operational and reporting tooling in the environment. In embodiments, the digital twin generation system 20818 may obtain data streams that are associated with the structural aspects of the data, such as the layout and 3D objects within facilities or the hierarchical design of a system of accounts. In embodiments, the data streams may include metadata streams that are associated with the nature of the data and data streams containing primary data (e.g., sensor data, sales data, IoT device data, point-of-sale data, behavioral data, survey data, and many others). For example, the metadata associated with a physical facility may include the types and layers of data that are being managed, while the primary data may include the instances of objects that fall within each layer.

In embodiments, the digital twin perspective builder 20820 leverages metadata, artificial intelligence, and/or other data processing techniques to produce a definition of information required for generation of the digital twin in the digital twin generation system 20818. In some embodiments, different relevant datasets are hooked to a digital twin (e.g., an asset digital twin, a trader digital twin, a marketplace digital twin, a marketplace host digital twin, or the like) at the appropriate level of granularity, thereby allowing for the structural aspects of the data (e.g., system of accounts, pricing data, sensor readings, or the like) to be a part of the data analytics process. One aspect of making a perspective function is that the user can change the structural view or the grain of data while potentially forecasting future events or changes to the structure to guide control. In embodiments, the term "grain of data" may refer to a single line of data. Examples of "grains of data" may include a detailed record of a transaction or a single vibration reading from a vibration sensor. Grain is a characteristic governing to some extent how the data can be combined to form different aggregations. For example, if data is aggregated by whole days, then it is not readily broken down with high accuracy by time of day. Generally, role-based and other market orchestration digital twins benefit from finer levels of data, as the aggregations on such data can be dynamic in nature. It is noted that different types of digital twins, or workflows therein, may involve different "sized" grains of data. For example, the grains of data that feed a marketplace host digital twin may be at a higher granularity level than the grains of data that feed a trader digital twin, or vice versa, depending on the particular workflow involved. In some embodiments, however, a marketplace host may drill down into a state of the marketplace host digital twin and the granularity for the selected state may be increased.

In embodiments, the digital twin perspective builder 20820 adds relevant perspective to the data underlying the digital twin, which is provided to the digital twin generation system 20818. For example, a trader digital twin may link in various other types of fuzzy data with market data and depict the potential impacts of market forces or other forces on a simulated digital twin. These different perspectives generated by the digital twin perspective builder 20820 may combine with the data simulation system 20830 to render relevant simulations of how scenario-based future states might be handled, such as ones involving an asset, an asset class, a workflow, or the like. The digital twin simulation system 20804 provides recommendations related to enhancing the digital twin-represented entity, such as to meet the needs of the anticipated future states.

In embodiments, a digital twin model is based on a combination of data and its relationship to the digital twin environments and/or processes. In embodiments, different digital twins may share the same data and different digital twin perspectives can be the results of a set of metadata built on top of a digital twin data model or data environment. In embodiments, the digital twin data model provides the details of the information to be stored and it is used to build a layered system where the final computer software code is able to represent the information in the lower levels in a form that is appropriate for the digital twin perspective being used.

In embodiments, the digital twin access controller 20822 informs the digital twin generation system 20818 of specific constraints around the roles of users able to view the digital twin as well as providing for dynamically adjustable digital twins that can adapt to, constrain, or release views of the data specific to each user role. For example, sensitive marketplace performance data might be obfuscated from most users when viewing a market orchestration digital twin, but the marketplace host may be granted access to view the marketplace performance information directly. In embodiments, the digital twin access controller 20822 may receive a user identifier and one or more data types. In response, the digital twin access controller 20822 may determine whether the user indicated by the user identifier has access to the one more data types. In some of these embodiments, the user's permissions and restrictions may be indicated in a user database.

In embodiments, the digital twin interaction manager 20824 manages the relationship between the structural view of the data in a market orchestration digital twin (e.g., as depicted/represented by the client application 20312) and the underlying data streams and data sources. In embodiments, this interaction layer makes the digital twin into a window into the underlying data streams through the lens of the structure of the data. In embodiments, the digital twin interaction manager 20824 determines the types of data that are being fed to an instance of a market orchestration digital twin while the instance is being executed by a client application 20312. Put another way, the digital twin interaction manager 20824 determines and serves data for an in-use digital twin. In embodiments, the digital twin interaction manager 20824 feeds raw data received from a data source to the digital twin. For example, vibration sensor readings of a machine listed in a marketplace for machine capacity may be fed directly to the executing digital twin of the machine. In embodiments, the digital twin interaction manager 20824 obtains data and/or instructions that are derived by another component of the market orchestration system platform 20500. For example, the digital twin interaction manager 20824 may obtain analytical data from the intelligent services system 20243 that is derived from incoming financial data, markets data, transaction data, asset performance data, operational data, sensor data, and the like. In this example, the digital twin interaction manager 20824 may then feed the analytical data to a market orchestration digital twin (e.g., trader digital twin), whereby the analytical data may be conveyed to the user. In examples, the digital twin interaction manager 20824 may receive simulated pricing data from the digital twin simulation system 20804 to convey pricing with respect to different assets, whereby the simulated data is derived using historical markets data. In this example, the digital twin interaction manager 20824 may receive requests for different assets from a client device 20340 depicting a market orchestration digital twin and may initiate the simulations for each of the assets. The digital twin interaction manager 20824 may then serve the results of the simulation to the requesting client application 20312.

In embodiments, the digital twin interaction manager 20824 may manage one or more workflows that are performed via a market orchestration digital twin. For example, the market orchestration system platform 20500 may store a set of marketplace workflows, where each marketplace workflow corresponds to a role within a marketplace and includes one or more stages. Workflows may include marketplace design workflows, marketplace set-up workflows, marketplace execution workflows, pricing and/or discounting workflows, trading workflows, currency conversion workflows, payment processing workflows, fulfillment workflows, advertising and promotion workflows, appraisal workflows, governance workflows, transactional workflows (such as smart contract workflows), compliance workflows, policy workflows, authentication workflows, reporting workflows, and many others. In embodiments, the digital twin interaction manager 20824 may receive a request to execute a workflow. The request may indicate the workflow and a user identifier. In response, the digital twin interaction manager 20824 may retrieve the requested workflow and may provide specific instructions and/or data to the client device 20340.

In embodiments, the digital twin simulation system 20804 receives requests to run simulations using one or more digital twins. In embodiments, the request may indicate a set of parameters that are to be varied and/or one or more simulation outcomes to output. In embodiments, the digital twin simulation system 20804 may request one or more digital twins from the digital twin generation system 20818 and may vary a set of different parameters for the simulation. In embodiments, the digital twin simulation system 20804 may construct new digital twins and new data streams within existing digital twins. In embodiments, the digital twin simulation system 20804 may perform environment simulation and/or data simulations. The environment simulation is focused on simulation of the digital twin ontology rather than the underlying data streams. In embodiments, the data simulation system 20830 generates simulated data streams appropriate for respective digital twin environments. This simulation allows for real world simulations of how a digital twin will respond to specific events such as changes in the asset pricing and/or changes in the demand of an asset.

In embodiments, the digital twin simulation system 20804 implements a set of models (e.g., physical mathematical forecasts, logical representations, or process diagrams) that develop the framework where data and the response of the digital twin can be simulated in response to different situational stimuli or sets of stimuli. In embodiments, the digital twin simulation system 20804 may include or leverage a computerized model builder that constructs a predicted future state of either the data and/or the response of the digital twin to the input data. In some embodiments, the computerized model library may be obtained from a behavior datastore 20840 that stores one or more behavior models that defines economic and/or scientific formulas or processes. The computerized digital twin model calculates the results of the model to build an interactive environment where users can watch and manipulate the simulated environment seeing how the entire system responds to specific changes in the environment.

In embodiments, digital twin behavior models may be updated and improved using results of actual experiments and real-world events. The use of such digital twin mathematical models and their simulations avoids actual experimentation, which can be costly and time-consuming. Instead, mathematical knowledge and computational power is used to solve real-world problems cheaply and in a time-efficient manner. As such, the digital twin simulation system 20804 can facilitate understanding of market behavior without actually testing the system in the real world.

In embodiments, simulations may be based upon and/or incorporate behavioral models that predict the behavior of assets and/or other marketplace-related entities (such as physical models that predict physical conditions (such as based on physical, chemical and biological principles)), economic models that predict the economic behavior of assets (such as models that predict the price of assets, the volume of assets traded, transactions involving the assets, or the like) and marketplace-related entities (such as models that predict the behavior of buyers, sellers, traders, companies, government entities, regulatory entities, or the like), human behavioral models that predict the behavior of humans (such as psychological models, physiological models, demographic models, population models, sociological models, game-theoretic models, and many others), and many others, including any of the models described herein or in the documents incorporated herein by reference and including hybrids and combinations of the foregoing.

In some embodiments, behavioral models may be configured to predict the outcome of one or more transactions. In these embodiments, the behavioral models may be configured for select fields (e.g., behavioral models configured for software-as-a-service (SaaS) transactions, behavioral models configured for medical device transactions, behavioral models configured for pharmaceutical transactions, behavioral models for real estate transactions, behavioral models for a vehicle repair service marketplace, and the like).

In embodiments, the simulations may include transaction simulations, buying simulations, selling simulations, trading strategy simulations, supply chain simulations, marketplace configuration simulations, marketing or advertising simulations, Federal Reserve interest rate change simulations, latency simulations, lending simulations, merger simulations, acquisition simulations, regulatory action simulations, workforce-related simulations, government policy and/or spending simulations, asset health simulations, asset performance simulations, off-chain activity simulations, new market entrant simulations, asset aging simulations, recession simulations, inflation simulations, influencer commentary simulations (e.g., commentary from financial news show hosts, chief executive officers, social media accounts or the like), legal outcome simulations (e.g., simulations involving the legal outcome of contract disputes, U.S. Supreme Court decisions, or the like), geopolitical simulations (e.g., war, sanctions, or the like) and many others.

In one non-limiting example, executing simulations of transactions may include varying the number of transactions, the types of transactions, the frequency of transactions, the timing of transactions, the parties involved in the transactions, and the like.

In embodiments, data collected and/or monitored via digital twin simulations may be used to optimize asset allocation, optimize marketing resources, optimize marketplace configuration, and many others. The digital twins and/or the behavioral models may be configured to continuously adapt in real-time as new real-world data is collected.

In embodiments, simulation environments may be constructed using a model capable of predicting future state. These models include deep learning, regression models, quantum prediction engines, and other forms of modeling engines that use historical data to build a future state prediction. In some embodiments, a consideration in making the digital twin models' function is the ability to also show the response of the perspective based digital twin structural elements, (e.g., defining the deformation of the axle of a tractor in response to different size loads). For example, the resultant digital twin representation can then be presented to the user in a virtual reality or augmented reality environment where specific perspectives are shown in their digital twin form.

In embodiments, the digital twin notification system 20832 provides notifications to users via market orchestration digital twins associated with the respective users. In some embodiments, digital twin notifications are an important part of the overall interaction. The digital twin notification system may provide the digital twin notifications within the context of the digital twin setting so that the perspective view of the notification is set up specifically to enable enlightenment of how the notification fits into the general digital twin represented ontology.

In embodiments, executive digital twins may include, but are not limited to, trader digital twins 20842, broker digital twins 20844, marketplace host digital twins 20850, marketplace digital twins 20852, asset digital twins 20854, and the like. The discussion of the different types of digital twins is provided for example and not intended to limit the scope of the invention. It is understood that in some embodiments, users may alter the configuration of the various market orchestration digital twins based on the needs of the marketplace, the reporting structure of the marketplace, and the like.

In embodiments, market orchestration digital twins are generated using various types of data collected from different data sources. As discussed, the data may include the market data 20280, the fundamental data 20282, historical data 20288, reference data 20284, data collected from sensor systems 20274, news sources 20278, third party data sources 20290, edge devices 20292, analytics data 20227, simulation/modeled data 20229, and marketplace databases 20280. In embodiments, the sensor data may be collected from one or more IIOT sensor systems (which may be initially collected by edge devices of the enterprise). In embodiments, historical data 20288 may refer to any data collected by the marketplace and/or on behalf of the marketplace and/or marketplace entities in the past. This may include sensor data collected from sensor systems, account data, transaction data, pricing data, smart contract data, order data, reference data, fundamental data, market data, maintenance data, purchase data, asset data, leasing data, and the like. Analytics data 20227 may refer to data derived by performing one or more analytics processes on data collected by and/or on behalf of the marketplace. Simulation/modeled data 20229 may refer any data derived from simulation and/or behavior modeling processes that are performed with respect to one or more digital twins. The marketplace databases 20216 may be a data lake that includes data collected from any number of sources. In embodiments, the market data 20280 may include data that is collected from disparate data sources concerning or related to marketplaces. The market data 20280 may be collected from many different sources and may be structured or unstructured. In embodiments, the market data 20280 may contain an element of uncertainty that may be depicted in a digital twin that relies on such market data 20280. It is appreciated that the different types of data highlighted above may overlap. For example, historical data 20288 may be obtained from the market data 20280 and/or the marketplace databases 20216 may include analytics data 20227, simulated/modeled data 20229, and/or the market data 20280. Additional or alternative types of data may be used to populate a market orchestration digital twin.

In embodiments, the data structuring system 20814 may structure the various data collected by and/or on behalf of the marketplace and/or marketplace entities. In embodiments, the digital twin generation system 20818 generates the market orchestration digital twins. As discussed, the digital twin generation system 20818 may receive a request for a particular type of digital twin (e.g., a trader digital twin 20842) and may determine the types of data needed to populate the digital twin based on the configuration of the requested type of digital twin. In embodiments, the digital twin generation system 20818 may then generate the requested digital twin based on the various types of data (which may include structured data structured by the data structuring system 20814). In some embodiments, the digital twin generation system 20818 may output the generated digital twin to a client application 20312, which may then display the requested digital twins.

In embodiments, a trader digital twin 20842 is a digital twin configured for a trader e.g., buyer and/or seller) in a marketplace. In embodiments, the trader digital twin 20842 may work in connection with the market orchestration system platform 20500 to provide simulations, predictions, statistical summaries, and decision-support based on analytics, machine learning, and/or other AI and learning-type processing of inputs (e.g., pricing data, counterparty data, asset data, order data, news, discussion boards, and the like). In embodiments, a trader digital twin 20842 may provide functionality including, but not limited to, identifying counterparties, identifying assets, bidding on assets, buying assets, listing assets for sale, removing assets from a listing, selling assets, trading assets, inspecting assets, generating order requests, cancelling order requests, generating smart contracts, strategy generation, risk management, and other trader-related activities.

In embodiments, the types of data that may populate a trader digital twin 20842 may include, but are not limited to: account data, macroeconomic data, microeconomic data, forecast data, demand planning data, analytic results of AI and/or machine learning modeling (e.g., financial forecasting), prediction data, asset data, recommendation data, securities-relevant financial data (e.g., earnings, profitability), industry analyst data (e.g., Gartner quadrant), strategic competitive data (e.g., news and events regarding industry trends and competitors), discussion board data, business performance metrics by business unit that may be relevant to evaluating performance of a company's business units (e.g., P&L, head count, factory health, R&D metrics, marketing metrics, and the like), and the like. In embodiments, the digital twin system 20208 may obtain financial data from, for example, publicly disclosed financial statements, third-party reports, tax filings, public news sources, and the like. In embodiments, the digital twin system 20208 may obtain strategic competitive data from public news sources, from publicly disclosed financial reports, and the like. In embodiments, macroeconomic data may be derived analytically from various financial and operational data collected by the market orchestration system platform 20500. In embodiments, the business performance metrics may be derived analytically, based at least in part on real time operations data, by the intelligent services system 20243 and/or provided from other users and/or their respective trader digital twins.

In embodiments, a trader digital twin 20842 may include high-level views of different states of the marketplace, including account summary information, asset pricing, order activity, real-time representations of assets, historical representations of assets, projected representations of assets (e.g., future states), real-time representations of companies, historical representations of companies, projected representations of companies, news and/or television data, economic sentiment data, asset sentiment data, social media data, discussion board data, charts, countdown to close information, lease terms, smart contract terms, order information, contract terms, and any other mission-critical information. In embodiments, a trader digital twin 20842 may allow a user to access and/or interact with asset digital twins. In embodiments, a trader digital twin 20842 may allow a user to interact with another trader digital twin 20842 and/or a broker digital twin 20844. The trader digital twin 20842 may initially depict the various states at a lower granularity level. In embodiments, a user that is viewing the trader digital twin 20842 may select to drill down into a selected state and view the selected state at a higher level of granularity. For example, the trader digital twin 20842 may initially depict a subset of the various states of a listed asset at a lower granularity level, including a pricing state (e.g., a visual indicator indicating pricing for an asset). In response to a selection, the trader digital twin 20842 may provide data, analytics, summary, and/or reporting including, but not limited to, real-time, historical, aggregated, comparison, and/or forecasted pricing data (e.g., real-time, historical, simulated, and/or forecasted revenues, liabilities, and the like). In this way, the trader digital twin 20842 may initially present the user (e.g., the buyer or seller) with a view of different aspects of the asset (e.g., different indicators to indicate different "health" levels of an asset) but may allow the user to select which aspects require more of her attention. In response to such a selection, the trader digital twin 20842 may request a more granular view of the selected state(s) from the market orchestration system platform 20500, which may return the requested states at the more granular level.

In embodiments, a trader digital twin 20842 may be configured to interface with the exchange suite 20204 to specify and provide a set of marketplace tools that may be leveraged by the trader. The marketplace tools may include an "in-twin" strategies tool, an "in-twin" trading practice tool, an "in-twin" news tool, an "in-twin" screener tool, an "in-twin" market monitoring tool, an "in-twin" entity profile tool, an "in-twin" account management tool, an "in-twin" charting tool, an "in-twin" order request tool, an "in-twin" smart contract system, and "in-twin" collaboration tools. The collaboration tools may include video conferencing tools, "in-twin" collaboration tools, presentation tools, word processing tools, spreadsheet tools, and the like, as described herein. In embodiments, the collaboration tools include various tools that allow communication between marketplace entities. In embodiments, the collaboration tools include digital-twin enabled video conferencing. In these embodiments, the market orchestration system platform 20500 may present participants in the video conference with the requested view of a market orchestration digital twin (e.g., an asset digital twin). For example, during a potential trade, a seller proposing to sell an asset may present the asset digital twin to the potential buyer. In this example, the seller may illustrate the results of simulations performed on the asset.

In embodiments, the trader digital twin 20842 may be configured to simulate one or more aspects of the marketplace. Such simulations may assist the user (e.g., the trader, buyer, and/or seller) in making buying, selling, and/or trading decisions. For example, simulations of a proposed asset purchase may be tested using the modeling, machine learning, and/or AI techniques, as described herein, by simulating economic factors (e.g., interest rates, inflation, unemployment, GDP growth), simulating fundamental factors (earnings, sales, cash flow, book value, enterprise value, dividends), simulating market sentiment, simulating asset physical performance, and/or other suitable marketplace-related parameters. In embodiments, the digital twin simulation system 20804 may receive a request to perform a simulation requested by the trader digital twin 20842, where the request indicates one or more parameters that are to be varied in one or more market orchestration digital twins. In response, the digital twin simulation system 20804 may return the simulation results to the trader digital twin 20842, which in turn outputs the results to the user via the client device display. In this way, the user may be provided with various outcomes corresponding to different parameter configurations. For example, a user may request a set of simulations to be run to test different trading strategies to see how the different strategies affect the overall impact on profits and losses. The digital twin simulation system 20804 may perform the simulations by varying the different trading strategies and may output the financial forecasts for each respective trading strategy. In some embodiments, the user may select a parameter set based on the various outcomes and iterate simulations based at least on the varied prior outcomes. Drawing from the previous example, the user may decide to select the trading strategy that maximizes financial forecasts. In some embodiments, an intelligent agent may be trained to recommend and/or select a parameter set based on the respective outcomes associated with each respective parameter set.

In embodiments, a trader digital twin 20842 may be configured to store, aggregate, merge, analyze, prepare, report, and distribute material relating to pricing, assets, financial reporting, ratings, rankings, financial trend data, income data, or other data related to a marketplace. A trader digital twin 20842 may link to, interact with, and be associated with external data sources, and able to upload, download, aggregate external data sources, including with the market orchestration system platform 20500's internal data, and analyze such data, as described herein. Data analysis, machine learning, AI processing, and other analysis may be coordinated between the trader digital twin 20842 and an analytics team based at least in part on using the intelligent services system 20243. This cooperation and interaction may include assisting with seeding marketplace-related data elements and domains in the digital twin data store 20838 for use in modeling, machine learning, and AI processing to identify an optimal trading strategy or some other marketplace-related metric or aspect, as well as identification of the optimal data measurement parameters on which to base judgment of a trading strategy's success. In embodiments, the digital twin system 20208 abstracts the different views (or states) within the digital twin to the appropriate granularity. For instance, the digital twin system 20208 may have access to all the sensor data collected on behalf of the marketplace as well as access to real-time sensor data streams. In this example, if the sensor readings from a particular physical asset listed in a marketplace (e.g., a piece of manufacturing equipment) are indicative of a potentially critical situation (e.g., failure state, dangerous condition, or the like), then the analytics that indicate the potentially critical situation may become very important to the trader. Thus, the digital twin system 20208, when building the appropriate perspective for the trader, may include a state indicator of the physical asset in the trader digital twin 20842. In this way, the trader can drill down into the state indicator of the physical asset to view the potentially critical situation at a greater granularity (e.g., the machinery and an analysis of the sensor data used to identify the situation).

In embodiments, a trader digital twin 20842 may be configured to report on the performance of assets traded in the marketplace. As described herein, reporting may include financial performance metrics, physical performance metrics, data regarding resource usage, or some other type of reporting data. In embodiments, an intelligent agent trained by the user may be trained to surface the most important reports to the user. For example, if the user (e.g., the trader) consistently views and follows up on P&L but routinely skips over reports relating to economic sentiment, the executive agent may automatically surface reports related to P&L to the user while suppressing economic sentiment data.

In embodiments, a trader digital twin 20842 may be configured to monitor, store, aggregate, merge, analyze, prepare, report, and distribute material relating to marketplace counterparties or named entities of interest. In embodiments, such data may be collected by the market orchestration system platform 20500 via data aggregation, web scraping, or other techniques to search and collect counterparty information from sources including, but not limited to, information on investment and/or acquisitions, press releases, SEC or other financial reports, or some other publicly available data. For example, a user wishing to monitor a certain counterparty may request that the trader digital twin 20842 provide materials relating to the certain counterparty. In response, the market orchestration system platform 20500 may identify a set of data sources that are either publicly available or to which the trader has access (e.g., internal data sources, licensed 3rd party data, or the like).

In embodiments, the client application 20312 that executes the trader digital twin 20842 may be configured with an intelligent agent 20234 that is trained on the trader's actions (which may be indicative of behaviors, and/or preferences). In embodiments, the intelligent agent 20234 may record the features relating to the actions (e.g., the circumstances relating to the user's action) to the intelligent agent system 20210. For example, the intelligent agent 20234 may record each time the user executes a trade (which is the action) as well as the features surrounding the trade (e.g., the type of action, the type of asset, the price of the asset, the counterparty or counterparties, the quantity of assets, market sentiment in relation to the asset, shipping and/or delivery information, and the like). The intelligent agent 20234 may report the actions and features to the intelligent agent system 20210 that may train the intelligent agent 20234 on the manner by which the intelligent agent 20234 can undertake or recommend trading tasks in the future. Once trained, the intelligent agent 20234 may automatically perform actions and/or recommend actions to the user. Furthermore, in embodiments, the intelligent agent 20234 may record outcomes related to the performed/recommended actions, thereby creating a feedback loop with the intelligent agent system 20210.

In embodiments, a trader digital twin 20842 may provide an interface for a trader to perform one or more trader-related workflows. For example, the trader digital twin 20842 may provide an interface for a trader to perform, supervise, or monitor strategy-generating workflows, asset listing workflows, asset inspection workflows, counterparty identification workflows, screening workflows, order workflows, smart contract workflows, shipping and/or delivery workflows, regulatory workflows, and the like.

In some embodiments, an AI-reporting tool may be configured to monitor one or more user-defined marketplace assets and/or marketplace asset properties. Examples of marketplace asset properties may include, but are not limited to, price, opening price, high price, low price, volume, P/E/market cap, 52-week high price, 52-week low price, average volume, and the like.

In embodiments, intelligent agents 20234 are expert agents that are trained to perform tasks on behalf of users (e.g., traders). As discussed, in some embodiments, a client application 20312 may monitor the use of the client application 20312 by a user when using the client application 20312. In these embodiments, the client application 20312 may monitor the states of a market orchestration digital twin that the user drills down into, decisions that are made, and the like. As the user uses the client application 20312, the intelligent agent system 20210 may train one or more machine-learned models on behalf of the particular user, such that the models may be leveraged by an intelligent agent 20234 to perform tasks on behalf of or recommend actions to the user.

In embodiments, the marketplace suite includes a trading practice tool 20233, which may include software tools that may be leveraged to train a user. In embodiments, the trading practice tool 20233 may leverage digital twins to improve training for trading in a marketplace. For example, a trading practice tool 20233 may provide real-world examples that are based on the data collected from the marketplace and may enable a user to train on the real-world examples using virtual pretend money provided by the trading practice tool 20233. The trading practice tool 20233 may present the user with different scenarios via a market orchestration digital twin 20220 and the user may take actions. Based on the actions, the trading practice tool 20233 may request a simulation from the market orchestration system platform 20500, which in turn returns the results to the user. In this way, the user may be trained on scenarios that are based on the actual marketplace of the user.

In embodiments, strategy tools 20240 are software tools that leverage digital twins to assist users to create trading strategies for a marketplace. In embodiments, a strategy tool 20240 may be configured to provide a graphical user interface that allows a trader to create trading strategies. In some embodiments, the strategy tool 20240 may be configured to request a simulation from the market orchestration system platform 20500 given the parameters set in the created strategy. In response, the market orchestration system platform 20500 may return the results of the simulation and the user can determine whether to adjust the strategy. In this way, the user may iteratively refine the strategy to achieve one or more objectives. In embodiments, an intelligent agent 20234 may monitor the track of the actions taken while the strategy is being refined by the user so that the intelligent agent system 20210 may train the intelligent agent 20234 to generate or recommend strategies to the user in the future.

In embodiments, an exchange host digital twin 20848 is a digital twin configured for a marketplace host. In embodiments, the marketplace host digital twin 20850 may work in connection with the market orchestration system platform 20500 to provide simulations, predictions, statistical summaries, decision-support, and configuration and control support based on analytics, machine learning, and/or other AI and learning-type processing of inputs (e.g., operations data, trader data, broker data, asset data, order data, regulatory data, fee data, and the like). In embodiments, a marketplace host digital twin 20850 may provide functionality including, but not limited to, configuring a marketplace/exchange, optimizing a marketplace/exchange, controlling a marketplace/exchange, performing regulatory reporting, risk management, compliance, optimizing profitability, optimizing volume, promotion of the marketplace to traders and other parties, and other marketplace host-related activities.

In embodiments, the types of data that may populate a marketplace host digital twin 20850 may include, but are not limited to: order data, marketplace/exchange performance data (e.g., execution speed, liquidity multiple, percentage of orders price improved, net improvement per order), asset data, demand planning data, trader data, broker data, analytic results of AI and/or machine learning modeling (e.g., marketplace configuration support), prediction data, asset data, recommendation data, securities-relevant financial data (e.g., earnings, profitability), discussion board data, social media data, fee data, regulatory data, and many others.

The marketplace host digital twin 20850 may include high-level views of different states and/or marketplace-related data, including trader data (e.g., number of traders), trader account activity data, transaction data, asset data, regulatory data, fee data, commission data, broker data, execution speed data, execution price data, price improvement data, gross price improvement data, percentage of orders price improved data, net improvement per order data, liquidity data, liquidity multiple data, market share data, latency data, spread data, at or better (AOB) than the National Best Bid or Offer (NBBO) data, effective spread data, effective spread over quoted spread (EFQ) data, savings per order data, order size data, and many other types of data.

The marketplace host digital twin 20850 may initially depict the various states at a lower granularity level. In embodiments, a user that is viewing the marketplace host digital twin 20850 may select a state to drill down into the selected state and view the selected state at a higher level of granularity. For example, the marketplace host digital twin 20850 may initially depict a subset of the various states of marketplace performance at a lower granularity level, including a marketplace performance state (e.g., a visual indicator indicating overall performance for a marketplace). In response to a selection, the marketplace host digital twin 20850 may provide data, analytics, summary, and/or reporting including, but not limited to, real-time, historical, aggregated, comparison, and/or forecasted performance data (e.g., real-time, historical, simulated, and/or forecasted execution speed, liquidity multiples, number of marketplace participants, and the like). In this way, the marketplace host digital twin 20850 may initially present the user (e.g., the marketplace host) with a view of different aspects of the marketplace (e.g., different indicators to indicate different "health" levels of a marketplace) but may allow the user to select which aspects require more of her attention. In response to such a selection, the marketplace host digital twin 20850 may request a more granular view of the selected state(s) from the market orchestration system platform 20500, which may return the requested state(s) at the more granular level.

In embodiments, the marketplace host digital twin 20850 may be configured to simulate one or more aspects of the marketplace. Such simulations may assist the user in making decisions, including, but not limited to, marketplace configuration decisions, fee decisions, and/or operational decisions. For example, simulations of a proposed marketplace configuration may be tested using the modeling, machine learning, and/or AI techniques, as described herein, by simulating marketplace configuration parameters 20306 (e.g., supported asset types, listing requirements, fees, and the like), simulating economic factors, simulating market participation, and/or other suitable marketplace-related parameters. In embodiments, the digital twin simulation system 20804 may receive a request to perform a simulation requested by the marketplace host digital twin 20850, where the request indicates one or more parameters that are to be varied in one or more market orchestration digital twins. In response, the digital twin simulation system 20804 may return the simulation results to the marketplace host digital twin 20850, which in turn outputs the results to the user via the client device display. In this way, the user may be provided with various outcomes corresponding to different marketplace configuration parameters. For example, a user may request a set of simulations to be run to test different fee strategies to see how the different strategies affect the overall impact on profits. The simulation system may perform the simulations by varying the different fee strategies and may output the profit forecasts for each respective fee strategy. In some embodiments, the user may select a parameter set based on the various outcomes and iterate simulations based at least on the varied prior outcomes. Drawing from the previous example, the user may decide to select the fee strategy that maximizes profit forecasts. In some embodiments, an intelligent agent may be trained to recommend and/or select a parameter set based on the respective outcomes associated with each respective parameter set.

In embodiments, a marketplace host digital twin 20850 may be configured to store, aggregate, merge, analyze, prepare, report, and distribute material relating to marketplace performance, marketplace activity, traders, brokers, profits, or other data related to a marketplace.

A marketplace host digital twin 20850 may link to, interact with, and be associated with external data sources, and able to upload, download, aggregate external data sources, including with the MOS's internal data, and analyze such data, as described herein. Data analysis, machine learning, AI processing, and other analysis may be coordinated between the marketplace host digital twin 20850 and an analytics team based at least in part on using the intelligent services system 20243. This cooperation and interaction may include assisting with seeding marketplace-related data elements and domains in the digital twin data store 20838 for use in modeling, machine learning, and AI processing to identify an optimal marketplace configuration or some other marketplace-related metric or aspect, as well as identification of the optimal data measurement parameters on which to base judgment of a trading strategy's success.

In embodiments, a marketplace host digital twin 20850 may be configured to report on the performance of the marketplace. As described herein, reporting may include financial performance metrics, physical performance metrics, data regarding resource usage, or some other type of reporting data. In embodiments, an intelligent agent trained by the user may be trained to surface the most important reports to the user. For example, if the user (e.g., the marketplace host) consistently views and follows up on execution speed but routinely skips over reports relating to liquidity multiple, the executive agent may automatically surface reports related to execution speed to the user while suppressing other data.

In embodiments, the client application 20312 that executes the marketplace host digital twin 20850 may be configured with an intelligent agent 20234 that is trained on the marketplace host's actions (which may be indicative of behaviors and/or preferences). In embodiments, the intelligent agent 20234 may record the features relating to the actions (e.g., the circumstances relating to the user's action) to the intelligent agent system 20210. For example, the intelligent agent 20234 may record each time the user configures a new marketplace (which is the action), as well as the features surrounding the configuration (e.g., the type of assets supported, anonymity rules, listing requirements, fees, supported trading types, shipping and/or delivery rules, and the like). The intelligent agent 20234 may report the actions and features to the intelligent agent system 20210 that may train the intelligent agent 20234 on the manner by which the intelligent agent 20234 can undertake or recommend marketplace configuration tasks in the future. Once trained, the intelligent agent 20234 may automatically perform actions and/or recommend actions to the user. Furthermore, in embodiments, the intelligent agent 20234 may record outcomes related to the performed/recommended actions, thereby creating a feedback loop with the intelligent agent system 20210.

In embodiments, a trader digital twin 20842 may provide an interface for a marketplace host to perform one or more marketplace host-related workflows. For example, the marketplace host digital twin 20850 may provide an interface for a marketplace to perform, supervise, or monitor regulatory workflows, exchange configuration workflows, and the like.

The market orchestration digital twins may be leveraged and/or may interface with other software applications without departing from the scope of the disclosure.

FIGS. 205-207 illustrate embodiments of the market orchestration system platform 20500 including a robotic process automation (RPA) system 20502 configured to automate internal marketplace workflows based on robotic process automation. The RPA system 20502 may develop a programmatic interface to a user interface of an external system 20504 such as devices, programs, networks, databases, and the like. The RPA system 20502 is configured to allow the market orchestration system platform 20500 to interface with an external system 20504 without using an application programming interface (API), or in addition to an API. The RPA system 20502 may develop an action list by watching a user perform a task in a graphical user interface (GUI) and recording the tasks in the action list. The RPA system 20502 may automate a workflow by repeating tasks of the action list in the GUI.

In some embodiments, the RPA system 20502 may include and/or communicate with an RPA AI system 20506 configured to perform robotic process automation processes. The RPA AI system 20506 may employ one or more machine learning techniques to develop one or more machine learned models. The machine learned models may be capable of developing, defining, and/or implementing RPA-based programmatic interfaces to facilitate interfacing of the market orchestration system platform 20500 with one or more external devices.

The RPA system 20502 may be necessary for the market orchestration system platform 20500 to communicate with an external system 20504 that does not have an API or that has an outdated API. For example, the RPA system 20502 may allow the market orchestration system platform 20500 to interface with an older external device that does not include an API or that has an outdated API. The RPA system 20502 may allow the market orchestration system platform 20500 to interface with an external system 20504 similarly to how a user would interface with the external system 20504, such as via a user interface of the external system 20504. In some embodiments, the RPA system 20502 allows the market orchestration system platform 20500 to emulate an action and/or a series of actions performable by a user to interface with an external system 20504. Examples of programmatic interfacing by the RPA system 20502 to interface with an external system 20504 include manipulation of markup language such as HTML, emulating computer mouse movements and/or "clicking on" one or more elements of a user interface, entering information into fillable fields and submitting the information via a client program and/or portal, and transmitting digital signals to an external system 20504 that appear to be from sent from a user device.

In some embodiments, the RPA system 20502 may be configured to facilitate communicating with new and/or updated external systems 20504. When a new external system is developed or an external system is updated, the RPA system 20502 may develop a new and/or updated programmatic interface to facilitate interfacing with the new and/or updated external system by the market orchestration system platform 20500 in a manner that is consistent with interfacing with an outdated external device, i.e., the external device prior to release of the new and/or updated external system. For example, the RPA system 20502 may be configured to provide inputs to the outdated external device, provide inputs to the new and/or updated external device, compare related outputs, and adjust inputs to the new and/or updated external device such that the market orchestration system platform 20500 may interface with the new and/or updated external device in a manner consistent with how the market orchestration system platform 20500 interfaced with the outdated external device.

In some embodiments, the RPA system 20502 may act as an API to outdated and/or external systems 20504. The RPA system 20502 may be configured such that the market orchestration system platform 20500 is externally represented as having an API capable of interfacing with one or more external devices or otherwise being capable of programmatically handling signals transmitted by external devices, wherein the RPA system 20502 has developed a programmatic interface for handling such requests other than an API. For example, an outdated external system may be configured to communicate via a series of signals understood by an outdated API. The RPA system 20502 may configure the market orchestration system platform 20500 to act as if the market orchestration system platform 20500 includes the outdated API.

In some embodiments, the RPA system 20502 may be configured to provide a user interface for use by one or more users of the market orchestration system platform 20500. The RPA AI system 20506 may, by one or more machine learning methods, create a user interface that allows a user to interface with one or more components and/or functions of the market orchestration system platform 20500. The RPA system 20502 may use robotic process automation techniques to operate the user interface created by the RPA AI system 20506. The RPA AI system 20506 may dynamically create and/or adjust the user interface according to variables such as changing market conditions, new and/or modified functions of the market orchestration system platform 20500, new and/or modified conditions of systems external to the market orchestration system platform 20500, and the like. Examples of new and/or modified conditions of systems external to the market orchestration system platform 20500 may include changes to product offerings, changes to product availability, changes to selling and/or buying options, new buying and/or selling parties participating in a marketplace, and the like.

In some embodiments, the RPA system 20502 may be configured to perform robotic process automation for multiple market systems in parallel. For example, the market orchestration system platform 20500 may be configured to manage a plurality of marketplaces, each of which require interfacing with users. The RPA system 20502 may manage the plurality of marketplaces substantially simultaneously and may compare input commands and related outputs from each market of the plurality of markets by a plurality of users in parallel. Management may, in one non-limiting example, include setting exchange rates, such as for trading between native currencies of each marketplace, such as among fiat currencies, cryptocurrencies, tokens, in-kind asset exchanges, and other mechanisms of exchange of value. Management may, in another non-limiting example, include identification of discrepancies in value, such as ones that create large arbitrage opportunities across marketplaces, and configuring marketplace rules, execution or the like to harmonize the marketplaces or otherwise mitigate adverse effects.

In some embodiments, the RPA system 20502 may be configured to avoid detection of robotic process automation by systems external to the market orchestration system platform 20500. Some of the external systems 20504 may be designed to attempt to detect when the external system is communicating with a system using robotic process automation, such as the market orchestration system platform 20500. Upon detecting that the market orchestration system platform 20500 is using robotic process automation, the external system may restrict, eliminate, or modify communication capabilities of the market orchestration system platform 20500 with the external system. The RPA system 20502 may emulate human interfacing with the external system to "trick" the external system into believing that the RPA system 20502 is a human user to avoid detection of the robotic process automation and avoid restriction or elimination of communication by the external system. The RPA system 20502 may avoid detection by, for example, dynamically changing paths of interaction with the external system, interacting with user interface elements with inconsistent timing, making human-like errors such as "mis clicks" or "typos," and the like.

In some embodiments, the RPA AI system 20506 may be configured to create a machine learned model for avoiding detection of robotic process automation. The machine learned model may be created by using data from interaction with one or more graphical interfaces by real human beings and developing robotic process automation techniques that emulate ways in which real humans' interface with the one or more graphical user interfaces. For example, training data may include mouse and/or touch timings and accuracy, typing speed and accuracy, elements of the graphical user interface used, and the like.

In some embodiments, the RPA system 20502 may be configured to validate data transmitted to and/or received from external systems 20504. The RPA system 20502 may validate one or more of data transmitted to the market orchestration system platform 20500 by users of the external system, data transmitted to the market orchestration system platform 20500 by users of the market orchestration system platform 20500, and/or data transmitted to the external system by users of the market orchestration system platform 20500. The RPA system 20502 may validate data by one or more of performing optical character recognition, performing image recognition and/or processing, identifying data stored on webpages, receiving data from a backend database of the external system, receiving data from a backend database of the market orchestration system platform 20500, and the like.

In some embodiments, the RPA AI system 20506 may be configured to develop one or more machine learned models for data validation. For example, the RPA AI system 20506 may use data transmitted by users and/or data received from one or more databases and/or sources external to the market orchestration system platform 20500 as training data to "learn" to identify valid data. The RPA AI system 20506 may transmit the one or more machine learned models for data validation to the robotic process automation system 20502. The robotic process automation system 20502 may implement the one or more machine learned models for data validation.

In some embodiments, the RPA system 20502 may be configured to facilitate validation of processes performed by the RPA system 20502. The RPA system 20502 may create a plurality of process validation logs as the RPA system 20502 performs one or more processes related to the market orchestration system platform 20500 and/or external systems 20504 on behalf of one or more users. The process validation logs may include one or more of timestamps, transaction receipts, user interface screenshots, or any other suitable data entry, file, and the like for providing validation of processes performed by the RPA system 20502. The RPA system 20502 may store the process validation logs in one or more databases and may transmit the process validation logs to the market orchestration system platform 20500 and/or users of the market orchestration system platform 20500. The RPA system 20502 may transmit the process validation logs automatically according to a schedule, upon demand by a user of the market orchestration system platform 20500, upon one or more conditions being true, and the like.

In some embodiments, the RPA system 20502 may be configured to adjust behavior of the robotic process automation in response to feedback acquired via one or both of data validation and process validation. A user of the market orchestration system platform 20500 may view validations of data provided by the RPA system 20502 and, in response to the validations of data, instruct the RPA system 20502 to adjust behavior of the robotic process automation system 20502. A user of the market orchestration system platform 20500 may view one or more of the process validation logs and, in response to the one or more process validation logs, instruct the RPA system 20502 to adjust behavior of the robotic process automation system 20502. Adjustment of behavior of the RPA system 20502 may include using different robotic process automation techniques to perform features of the RPA system 20502, such as, for example, changing RPA-based user interface elements presented to users of the market orchestration system platform 20500, adjusting how the RPA system 20502 interfaces with one or more external systems 20504, and any other suitable adjustment by the RPA system 20502.

In some embodiments, the RPA AI system 20506 may use data validation information and/or feedback, process validation logs, or a combination thereof as training data. The RPA AI system 20506 may train one or more machine learned models to influence, adjust, and/or otherwise control behavior of the RPA system 20502 based upon the data validation information and/or feedback, process validation logs, or a combination thereof.

In some embodiments, the RPA system 20502 may be configured to perform image processing to recognize images in graphical user interfaces with which the RPA system 20502 interfaces. Graphical user interfaces of external systems 20504 with which the RPA system 20502 interfaces may be changed and/or updated, thereby potentially disrupting robotic process automation-based interfacing with the GUI. The RPA system 20502 may automatically detect changes to the GUI via image recognition and/or image processing. The RPA system 20502 may automatically update robotic process automation-based interfacing with the updated GUI to facilitate continued interfacing with the updated GUI and avoid errors or interruptions in communication with the external system.

In some embodiments, the RPA AI system 20506 may use image process optimization to use one or more machine learned models to automatically correct robotic process automation-based interfacing with the external system of the RPA system 20502. For example, the RPA AI system 20506 may use a plurality of GUIs having images as training data to create a machine learned model capable of automatically detecting changes in GUIs of external systems 20504 and determining how to adjust robotic process automation of the RPA system 20502 such that the RPA system 20502 may automatically continue interfacing with the GUI in light of a change to the GUI.

In some embodiments, the RPA system 20502 may be configured to develop a human training system for instructing humans to interface with one or more user interfaces of the market orchestration system platform 20500 and/or one or more external systems 20504. The human training system may teach one or more human users a plurality of actions and/or techniques employed by the RPA system 20502 to interface with the one or more user interfaces such that the human users may perform tasks similarly to the RPA system 20502. The human training system may include one or more documents, videos, tutorials, and the like for facilitating human learning of actions and/or techniques for interfacing with the user interfaces.

In some embodiments, the RPA system 20502 may be configured to process and document success criteria of robotic process automation implemented by the RPA system 20502. The processed and documented success criteria is descriptive such that a human user of the market orchestration system platform 20500 and/or the RPA system 20502 may use the processed and documented success criteria to understand one or more process steps and/or algorithms used by the RPA system 20502 to facilitate interfacing with external systems 20504 and/or to automate internal marketplace workflows of the market orchestration system platform 20500.

In some embodiments, the RPA system 20502 may implement gamification of robotic process automation capabilities of the market orchestration system platform 20500. The gamification of robotic process automation capabilities may include awarding points to users for performing tasks desirable to operation of the market orchestration system platform 20500 and/or desirable for improvement of robotic process automation operations of the market orchestration system platform 20500. For example, points may be awarded for augmentation of a robotic process automation algorithm. Users who have been awarded points may compete with one another, and digital and/or physical prizes may be awarded to users who have achieved one or more point thresholds and/or have ranked above one or more other users on a points leaderboard.

FIG. 206 illustrates embodiments of the market orchestration system platform 20500 including an edge device 20292 configured to perform edge computation and intelligence. In some embodiments, edge computation and intelligence may include performing one or both of data processing and data storage in an area that is physically close to where the processed and/or stored data is needed. In some embodiments, the market orchestration system platform 20500 may include a plurality of edge devices 20292. By way of example, the edge device 20292 may be a router, a routing switch, an integrated access device, a multiplexer, a local area network (LAN) and/or wide area network (WAN) access device, an Internet of Things device, and/or any other suitable device. In some embodiments, edge computation and intelligence may include performing data processing and/or data filtering. The processed and/or filtered data may be transmitted directly to devices that will use the processed and/or filtered data. The processed and/or filtered data may be transmitted along transmission paths with less congestion than general-purpose or high-traffic data transmission paths. Transmission of the processed and/or filtered data may use lower bandwidth than would transmission of unprocessed and/or unfiltered data.

In some embodiments, the edge device 20292 may implement local edge intelligence to anticipate market-driving factors using data received by and/or stored by the edge device 20292. The edge device 20292 may be directed to collecting and processing data related to one or more of a particular buyer and/or seller, product, class of products, class of buyers and/or sellers, market, class of markets, and the like. In some embodiments, the edge device 20292 may be situated physically near to a remote market and/or trading area. For example, the edge device 20292 may be positioned and configured to collect data regarding transactions related to a particular type of product in a geographical region. The edge device may perform data processing, analytics, filtering, trend finding, prediction making, etc. related to the data and may send processing results, analytics, filtered data, trends, predictions, etc. or portions thereof to a more centralized server, processor and/or data center within the market orchestration system platform 20500.

In some embodiments, the edge device 20292 may be configured to perform decision making while being physically and/or electronically isolated from some or all other components of the market orchestration system platform 20500. Herein, electronic isolation may mean or include being temporarily unable to communicate with one or more other systems, devices, components, etc. The edge device 20292 may make decisions based upon outputs and/or conclusions drawn from the data processing, analytics, filtering, trend finding, prediction making, etc. related to data received by the edge device 20292. Examples of decisions made by the edge device 20292 include whether to validate one or more pieces of data, whether to validate a user of the market orchestration system platform 20500 or a portion thereof, whether a transaction has been performed, whether to perform a transaction, and the like. The edge device 20292 may transmit data related to decisions made by the edge device 20292 to other components of the market orchestration system platform 20500.

In some embodiments, in cases where the edge device 20292 is temporarily electronically isolated from other components of the market orchestration system platform 20500, the edge device 20292 may make decisions on behalf of other components of the market orchestration system platform 20500, and may have the decisions audited, evaluated, and/or recorded by other components of the market orchestration system platform 20500 upon being reconnected with the other components of the market orchestration system platform 20500. The edge device 20292 may be restricted from making some decisions in absence of connection to and/or oversight by other components of the market orchestration system platform 20500. Examples of restricted decisions may include decisions related to transactions where confidentiality and/or security are of concern, where intellectual property, trade secrets, and/or proprietary information are to be transmitted, and the like.

In some embodiments, the edge device 20292 may store a copy of a distributed ledger, the distributed ledger containing information related to one or more marketplaces and/or transactions managed by the market orchestration system platform 20500. The distributed ledger may be a cryptographic ledger, such as a blockchain. The edge device 20292 may write blocks to the distributed ledger containing market orchestration information and may have the blocks verified by comparison with copies of the distributed ledger stored on other components of the market orchestration system platform 20500.

In some embodiments, the distributed ledger may be configured to manage ownership of property such as physical goods, digital goods, intellectual property, and the like. An initial owner of property, such as a seller, may be recorded in a block of the distributed ledger. The distributed ledger may record changes in ownership as ownership of the property changes, such as from a seller to a buyer, from a manufacturer to a retailer to a buyer, etc.

In some embodiments, the market orchestration system platform 20500 may include a ledger management system configured to manage a network of devices, such as edge devices, that store copies of the distributed ledger. The devices that store copies of the distributed ledger may be configured to transmit copies stored thereon to the ledger management system for aggregation, comparison, and/or validation. The ledger management system may establish a whitelist of trusted parties and/or devices, a blacklist of untrusted parties and/or devices, or a combination thereof. The ledger management system may assign permissions to particular users, devices, and the like. Versions of the distributed ledger may be compared to prevent duplicate transactions such as the sale of multiple copies of a unique good. In embodiments, where the market orchestration system platform 20500 includes a plurality of edge devices 20292, edge devices 20292 of the plurality of edge devices 20292 may each store a copy of the distributed ledger and may compare copies against one another with respect to validation of blocks and addition of new blocks by some and/or all of the edge devices 20292.

In some embodiments, the market orchestration system platform 20500 may implement one or more distributed update management algorithms for updating distributed devices such as the edge device 20292. The distributed update management algorithm may include one or more procedures for how and when to roll out updates to the distributed devices. The market orchestration system platform 20500 may manage versions of market orchestration and/or edge computation software via the distributed update management algorithms. The distributed devices may receive updates directly from the market orchestration system platform 20500, may transmit updates to one another, or a combination thereof.

In some embodiments, wherein the market orchestration system platform 20500 includes a plurality of edge devices 20292, the edge devices 20292 may communicate with one another to record and/or validate transactions. The edge devices 20292 may also communicate data with one another related to one or more markets, products, regions, users, traders, buyers, sellers, third parties, and the like. An edge device 20292 of the plurality of edge devices 20292 may communicate such information when able in cases where an edge device 20292 is electronically isolated from other edge devices 20292 and/or other components of the market orchestration system platform 20500.

In some embodiments, a first edge device 20292A that is electrically isolated and is assigned to orchestrate a particular trade and/or market may be supported by a second edge device 20292B. The second edge device 20292B may be assigned to orchestrate the same particular trade and/or market in case the first edge device 20292A fails to orchestrate the trade and/or market and/or is out of communication with other components of the market orchestration system platform 20500 for an extended period of time such that orchestration of the trade and/or market by the first edge device 20292A is unverifiable. Upon reentering communication range, the first edge device 20292A may update the second edge device 20292B and/or other components of the market orchestration system platform 20500 with transactions and/or other orchestration operations that took place while the first edge device 20292A was electronically isolated. Similarly, edge devices 20292C, 20292D may act as supports for other edge devices.

In some embodiments, the market orchestration system platform 20500 may implement a hardware failure algorithm configured to make decisions when one or more components of the market orchestration system platform 20500, such as the edge device 20292, ceases operation and/or is otherwise unable to completely operate properly. The hardware failure algorithm may include, for example, assigning an edge device 20292 to overtake operations that had been previously assigned to a now malfunctioning or nonfunctioning edge device 20292.

In some embodiments, the market orchestration system platform 20500 may implement a data routing algorithm configured to optimize flow of data transmitted to and/or from the edge device 20292, other components of the market orchestration system, external systems 20504, or a combination thereof. The edge device 20292 may include one or more signal amplifiers, signal repeaters, digital filters, analog filters, digital-to-analog converters, analog-to-digital converter, and/or antennae configured to optimize the flow of data. In some embodiments, the network enhancement system may include a wireless repeater system such as is disclosed by U.S. Pat. No. 7,623,826 to Pergal, the entirety of which is hereby incorporated by reference. The edge device 20292 may optimize the flow of data by, for example, filtering data, repeating data transmission, amplifying data transmission, adjusting one or more sampling rates and/or transmission rates, and implementing one or more data communication protocols. In embodiments, the edge device 20292 may transmit a first portion of data over a first path of the plurality of data paths and a second portion of data over a second path of the plurality of data paths. The edge device 20292 may determine that one or more data paths, such as the first data path, the second data path, and/or other data paths, are advantageous for transmission of one or more portions of data. The edge device 20292 may make determinations of advantageous data paths based upon one or more networking variables, such as one or more types of data being transmitted, one or more protocols being suitable for transmission, present and/or anticipated network congestion, timing of data transmission, present and/or anticipated volumes of data being or to be transmitted, and the like. Protocols suitable for transmission may include transmission control protocol (TCP), user datagram protocol (UDP), and the like. In some embodiments, the edge device 20292 may be configured to implement a method for data communication such as is disclosed by U.S. Pat. No. 9,979,664 to Ho et al., the entirety of which is hereby incorporated by reference.

In some embodiments, the edge device 20292 may implement a hostile trading detection algorithm configured to detect and protect the market orchestration system platform 20500 against external systems 20504 attempting to fraudulently interact with the market orchestration system platform 20500. Examples of attempting to fraudulently interact with the market orchestration system platform 20500 include submitting false transaction information, false product information, false user and/or party information, attempting to make the market orchestration system platform 20500 perform and/or orchestrate a fraudulent transaction, and the like. The hostile trading detection algorithm may be implemented via a machine learning model trained to detect and/or protect against fraudulent interaction.

In some embodiments, the edge device 20292 may implement gamification of distributed computing capabilities of the market orchestration system platform 20500. The gamification of distributed computing capabilities may include awarding points to users for performing tasks desirable to operation of the market orchestration system platform 20500 and/or desirable for improvement of robotic process automation operations of the market orchestration system platform 20500. For example, points may be awarded for trading goods of a particular type and/or within a particular region. Users who have been awarded points may compete with one another, and digital and/or physical prizes may be awarded to users who have achieved one or more point thresholds and/or have ranked above one or more other users on a points leaderboard.

FIG. 207 illustrates embodiments of the market orchestration system platform 20500 including a digital twin system 20208 configured to receive data from the edge device 20292 and create a digital replica, i.e., a digital twin, from the received data. The digital replica created by the digital twin system 20208 may be a digital replica of one or more of a market, a product, a seller, a buyer, a transaction, and the like and may be created using any or all of the data received from the edge device 20292. The edge device 20292 may transmit market orchestration-related data, such as data related to a market, a product, a seller, a buyer, a transaction, and the like, or a combination thereof. In embodiments, where the market orchestration system platform 20500 includes a plurality of edge devices 20292, the digital twin system 20208 may create the digital replica based on data received from multiple of the plurality of edge devices 20292.

In some embodiments, the digital twin system 20208 may be configured to present a simulation of a market, a product, a seller, a buyer, a transaction, or a combination thereof via the digital replica. The digital replica may be a two-dimensional or three-dimensional simulation of a market, a product, a seller, a buyer, a transaction, and the like. The digital replica may be viewable on a computer monitor, a television screen, a three-dimensional display, a virtual-reality display and/or headset, an augmented reality display such as AR goggles or glasses, and the like. The digital replica may include one or more graphical components. The digital replica may be configured to be manipulated by a user of the market orchestration system platform 20500. Manipulation by the user may allow the user to view one or more portions of the digital replica in greater or lesser detail. In some embodiments, the digital twin system 20208 may be configured such that the digital replica may simulate one or more potential future states of a market, a product, a seller, a buyer, a transaction, etc. The digital replica may simulate the one or more potential future states of a market, a product, a seller, a buyer, a transaction, etc. based on simulation parameters provided by the user. Examples of simulation parameters include a progression of a period of time, potential actions by parties such as buyers or sellers, increases in supply and/or demand of products, resources, etc., changes in government regulations, and any other suitable parameter for simulation of a market or related to market orchestration.

In some embodiments, the edge device 20292 may be configured to facilitate pre-calculation and aggregation of data for a set of user-configured reports. The user-configured reports may be integrated into the digital replica created by the digital twin system 20208. A user of the market orchestration system platform 20500 may define one or more parameters of the user-configured report to be included in the digital replica. The edge device 20292 may implement one or more data processing and/or filtering according to the parameters of the user-configured report. The edge device 20292 may transmit processed and/or filtered data relevant to the user-configured report parameters to the digital twin system 20208. Upon receiving the processed and/or filtered data, the digital twin system 20208 may create the digital replica including the user-configured report using the received data and present the digital replica to the user.

Referring to FIG. 205, in some embodiments, the edge device 20292 may be configured to collect and process data for use by one or more artificial intelligence (AI) systems. The AI systems 20508 may include the RPA AI system 20506, one or more artificial intelligence systems configured to facilitate creation of the digital replica by the digital twin system 20208, and/or any other artificial intelligence systems connected to and/or included in the market orchestration system platform 20500. The edge device 20292 may be configured to collect and process and/or filter data such that the data is suitable for use by the one or more AI systems 20508. An example of processed and/or filtered data collected by the edge device 20292 for use by the one or more AI systems 20508 is training data for use in training one or more machine learned models.

In some embodiments, the edge device 20292 may be configured to locally store data related to creation of the digital replica by the digital twin system 20208. In cases where the digital replica is related to a particular region, seller, buyer, market, business, etc., the edge device 20292 may be particularly positioned to collect and store data for use in populating the digital replica, for example, by being positioned nearby to the particular region, seller, buyer, market, business, etc. The edge device 20292 may receive, process, filter, organize, and/or store data prior to transmission of the data to the digital twin system 20208 such that the data is relevant to and/or suitable for population of the digital replica. In some embodiments, the edge device 20292 may be configured to organize timing of transmission of data used to populate the digital replica. The edge device 20292 may implement one or more algorithms configured to measure and/or predict congestion of one or more network paths and/or routes and may perform organization of timing of transmission data based on the measurements and/or predictions of the congestion. The edge device 20292 may in some cases prioritize transmission of some types of data over others, such as according to priorities set by a user or by the digital twin system 20208. For example, the edge device 20292 may schedule regular transmissions of low-priority information during evening hours, when congestion is low, and may transmit high-priority information substantially immediately upon receiving the high-priority information and/or receiving a request for the high-priority information. In some embodiments, the edge device 20292 may be configured to select a data protocol for transmission of data used to populate the digital replica. The edge device 20292 may implement one or more algorithms configured to select one or more optimal network paths and/or routes and may select the data transmission protocol based on the measurements and/or predictions of the congestion.

In some embodiments, the edge device 20292 may be in communication with and receive data from a plurality of sensors. The edge device 20292 may be configured to intelligently multiplex alternative sensors among available sensors in a shipping environment for the digital replica.

In embodiments, the intelligent services system 20243 provides a framework for providing intelligence services to the market orchestration system platform 20500. In some embodiments, the intelligent services system 20243 framework may be adapted to be at least partially replicated in the market orchestration system platform 20500. In these embodiments, intelligence service clients 8836, including the market orchestration system platform 20500, may include some or all of the capabilities of the intelligent services system 20243, whereby the intelligent services system 20243 is adapted for the specific functions performed by the market orchestration system platform 20500. Additionally or alternatively, in some embodiments, the intelligent services system 20243 may be implemented as a set of microservices, such that the market orchestration system platform 20500 may leverage the intelligent services system 20243 via one or more APIs exposed to the market orchestration system platform 20500. In these embodiments, the intelligent services system 20243 may be configured to perform various types of intelligence services that may be adapted for different intelligence clients 8836. In either of these configurations, the market orchestration system platform 20500 and/or other intelligence service clients 8836 may provide an intelligence request to the intelligent services system 20243, whereby the request is to perform a specific intelligence task (e.g., a decision, a recommendation, a report, an instruction, a classification, a prediction, a training action, an NLP request, or the like). In response, the intelligent services system 20243 executes the requested intelligence task and returns a response to the intelligence service client 8836. Additionally or alternatively, in some embodiments, the intelligent services system 20243 may be implemented using one or more specialized chips that are configured to provide AI assisted microservices such as image processing, diagnostics, location and orientation, chemical analysis, data processing, and so forth.

In embodiments, an artificial intelligent services system 20243 receives an intelligence request and any required data to process the request from the market orchestration system platform 20500. In response to the request and the specific data, one or more implicated artificial intelligence system perform the intelligence task and output an "intelligence response" to the market orchestration system platform 20500.

In embodiments, the market orchestration system platform 20500 may provide access to and/or integrate artificial intelligence system, which may provide access to and/or integrate a robotic process automation (RPA) module 8816. The RPA module may facilitate, among other things, computer automation of producing and validating market orchestration workflows (e.g., transactional workflows, market configuration workflows, regulatory workflows, and many others). The RPA module provides automation of tasks performed by humans, such as reviewing offers (e.g., offers to sell, offers to buy, and many others), researching assets and/or services listed in a marketplace, executing transactions (e.g., approving a set of transactions, shopping, buying, selling, trading, making payments, receiving payments, and many others) and/or otherwise participating in a marketplace (e.g., disapproving a set of transactions, listing items for sale, negotiating with buyers and/or sellers, and the like), managing a financial account and/or digital wallet, identifying assets that could be listed for sale, lease, or the like (e.g., items that have not been used, collectibles that have increased significantly in value, items produced by humans, items produced by 3D printers, and many others), identifying resources that could be listed for sale, lease, or the like (e.g., use of a vacation home, excess energy collected from solar panels, use of an otherwise idle fleet of robots, and many others), identifying the need for an asset and/or resource (e.g., a grocery item, an outfit for an upcoming event, a replacement part for a vehicle, a haircut, and many others), scheduling services (e.g., appointments, reservations, and the like), receiving and reviewing written information, reviewing receipts, entering data into user interfaces, converting or otherwise processing data such as files or records, recording observations, generating documents such as reports or tax filings, communicating with other users by mechanisms such as email, tracking a package, detecting and/or resolving transactional issues (e.g., incorrect amount of money charged, incorrect amount of money received, nonpayment, incorrect items received, damage to received items, partial performance of a service, problems with shipment, fraud, and the like), and many others.

As an example, a user may receive an offer for a transaction, such as a purchase or sale of goods or services. The RPA module may receive the offer on behalf of the user and respond to the transaction based on information regarding how the user has previously responded to similar offers. As a first example, the RPA module may determine whether the user has previously considered similar offers (e.g., by opening or reading a message regarding an offer, or acting on the message, such as following a hyperlink included in the message) or has declined to consider similar offers (e.g., by deleting the message, declining to read the message, or declining to act on the message). Upon receiving an offer that is similar to previous offers, the RPA module may determine that the user may consider the offer and therefore automatically share the message with the user, or determine that the user is unlikely to consider the offer and therefore automatically discard the message. As a second example, the RPA module may determine the steps that a user has previously taken to consider similar offers, such as searching for more information about a product or service associated with an offer, reading third-party reviews of a product or service associated with an offer, discussing the offer with another person, or assessing the user's current inventory or patronage of a product or service associated with the offer. Upon receiving an offer that is similar to previous offers, the RPA module may automatically perform some of the steps that the user has previously taken to aid the consideration of the offer by the user, such as automatically retrieving and presenting to the user some additional information about a product or service associated with the offer, automatically suggesting or initiating a discussion between the user and another person regarding the offer, or automatically notifying the user of the user's current inventory or patronage of a product or service associated with the offer. As a third example, the RPA module may determine the steps that a user has previously taken upon deciding to accept an offer, such as responding to the message, initiating a financial exchange associated with the offer, recording the transaction in a data source, allocating capacity for the good or service associated with the offer, or creating an entry in a calendar regarding a delivery of the good or provision of the service associated with the offer. Upon determining an acceptance of the offer by the user, the RPA module may automatically take some steps to accept or perform the offer, such as automatically responding to the message, automatically initiating the financial transaction, automatically creating a record of the transaction in the data source, automatically allocating capacity for the good or service, or automatically updating the user's calendar to create an entry for the delivery of the good or the provision of the service. In some cases, the RPA module may suggest some of the aforementioned steps to a user, and then perform the steps on behalf of the user upon receiving confirmation from the user. Alternatively or additionally, the RPA module may perform some of the aforementioned steps on behalf of the user without soliciting and receiving confirmation from the user.

In some cases, the tasks involve a workflow that includes a number of interrelated steps, contextual information that relates to the task, and interactions with other applications and humans. The RPA module can be configured to receive or learn one or more such workflows on behalf of the human and in a manner similar to the actions and logic of the human, and can thereafter perform such workflows in response to various triggers such as events. For example, the RPA module can be configured to receive or learn one or more workflows related to approving a transaction (e.g., authorizing payment and the like) on behalf of the human and in a manner similar to the actions and logic of the human in response to receiving an offer for the sale of a set of assets. As a first example, the RPA module may receive, from a user, a request to observe and record a set of steps by which the user receives, considers, accepts, and/or performs an offer for the sale of a set of assets. The RPA module may record the steps performed by the user and replicate the steps upon request of the user in regard to another transaction, or may automatically perform the steps to process another transaction in a similar manner. As a second example, the RPA module may receive, from a user, a set of instructions by which the RPA module can receive, process, and complete a transaction. In some embodiments, the instructions are provided by the user through a no-code or low-code graphical user interface, such as a block-based development environment in which the user arranges a sequence of blocks to specify a sequence of instructions for performing a task associated with an offer. The instructions can comprise a script that can be executed by the RPA module to perform a workflow associated with the task. At the request of the user to process a subsequent offer, the RPA module can perform the instructions of the workflow to process the offer in the manner specified by the user. Alternatively or additionally, upon the occurrence of a condition or trigger involving an offer (e.g., a receipt of the offer through a messaging channel and/or a determination of a personal need of the user for a good or service), the RPA module can perform the instructions of the workflow to process or initiate the offer in the manner specified by the user. As a third example, the RPA module may observe a set of actions taken by a user over a period of time. The RPA module may group one or more actions taken by the user into one or more workflows that are associated with an offer (e.g., a pattern of actions that the user takes in response to a condition or trigger that is associated with an offer). Upon receiving or identifying another offer that is similar to previous offers handled by the user, the RPA module may perform a similar set of actions to process the order.

In some embodiments, the RPA module performs a workflow in cooperation with a human or another workflow. For example, a workflow can include one or more human portions to be performed by a human and one or more automated portions to be performed by the RPA module. In some embodiments, the RPA module can first perform an automated portion and deliver a result of the automated portion to the human so that the human can perform a human portion based on the result. In some embodiments, the RPA module can receive a result of a human portion of the workflow and can perform an automated portion of the workflow on the result of the human portion of the workflow. In some embodiments, the RPA module can perform a first automated portion of the workflow, present a result of the first automated portion to a human for review and validation, and can perform a second automated portion of the workflow based on the review and validation of the result of the first automated portion based on a result of the review and validation by the human. For example, the RPA module may review an offer for sale of an asset and deliver a recommendation to proceed with the asset purchase to the human, and upon transaction authorization by the human, the RPA module may then execute the asset purchase by entering payment information into an application user interface and arrange for delivery of the asset. In some embodiments, the RPA module may coordinate with another person and/or another RPA module to complete a task associated with an offer. For example, in order to complete a transaction on behalf of a user, the RPA module may communicate with a partner, colleague, or team member of the user, such as sending a request to initiate or complete a financial transaction related to the offer. Alternatively or additionally, the RPA module may communicate with another RPA module to initiate or complete a financial transaction related to the offer, such as communicating with another RPA module that can authorize the financial transaction on behalf of a partner, colleague, or team member of the user.

In embodiments, the RPA module may leverage the artificial intelligence system to determine when user approval of a transaction is required. For example, user approval may be necessary for purchases over a threshold amount, for non-routine purchases, for the resale and listing of collectibles, and/or the scheduling of appointments, while user approval may not be necessary for inexpensive purchases, rules-based purchases (e.g., rules specified by the human user), and/or routine purchases. In embodiments, the RPA module can generate an output communicated to one or more users (e.g., a visual notification displayed for a user of a digital twin, a visual notification displayed for a user of a digital wallet, a visual notification displayed for a user of a device (e.g., a mobile device, a wearable, an augmented reality headset, a virtual reality headset, an IoT device, or the like), or a message that is transmitted to a user by a communication channel such as email, text message, or voice output). In embodiments, the output may include a GUI such as to enable the user to approve a transaction.

In some embodiments, the RPA module may use one or more machine learning algorithms to perform one or more steps associated with an offer for a transaction. As a first example, the RPA module may train a machine learning model to learn the steps by which the user receives, considers, or completes transactions that are associated with offers for transactions. In some cases, the RPA module may use a pattern recognition machine learning model to associate a pattern of actions taken by a user with a workflow that the user performs in regard to a particular type of offer. The RPA module may use such a trained machine learning model to receive, consider, or complete a transaction associated with an offer on behalf of the user. As a second example, the RPA module may use a natural-language processing (NLP) machine learning model to understand natural-language communication that is associated with an offer, such as a natural-language description of the offer by a vendor of a product or a service provider of a service, or to evaluate one or more natural-language reviews of a product or service associated with an offer. The RPA module may use information extracted from such natural-language communication in order to receive, consider, or complete a transaction associated with the offer on behalf of the user. As a third example, the RPA module may use a natural-language synthesis machine learning model to generate natural-language communication in order to generate communication with the user or other individuals associated with an offer. For example, the RPA module may suggest, to the user, a natural-language message that can be sent to accept or perform an offer or to communicate with another individual regarding the offer. Upon receiving acceptance by the user, the RPA module may send the natural-language message to another user as part of the consideration, acceptance, and/or performance of the offer. As a fourth example, the RPA module may use one or more control-based machine learning models to perform an offer on behalf of the user. In embodiments, after completing a financial transaction regarding a product, the RPA module may control one or more devices, robots, autonomous vehicles, or the like to receive, deliver, transport, install, configure, and/or use the product on behalf of the user.

In some embodiments, the RPA module may interface with an extended reality (XR) environment, such as an augmented reality (AR) environment or a virtual reality (VR) environment, in order to suggest, evaluate, accept, and/or perform an offer on behalf of a user. As a first example, upon receiving an offer and determining that the offer might be of interest to the user, the RPA module may present an indicator of the offer to the user within the XR environment, such as a location marker to indicate a location where a product or service associated with the offer is available. As a second example, the RPA module may generate, within the XR environment, one or more indicators of information about the offer, such as a depiction of a product or a result of a service (e.g., altering an avatar of the user or another individual to depict the avatar wearing a garment that is associated with the offer, or updating a visual depiction of a virtual environment of the user to include a piece of furniture that is associated with the offer). As a third example, the RPA module may initiate and/or conduct, within the XR environment, an acceptance or performance of a transaction associated with an offer, such as exchanging a virtual currency with another individual, and presenting a depiction or indication of the exchange of virtual currency with the other individual within the XR environment.

In embodiments, the market orchestration system platform 20500 includes a policy engine that allows edge-network aware policy execution for trade instances. The policy engine may be an interface and system configured to enable a user to design, configure, and deploy a set of policies, which can be associated and/or linked to a workload (e.g., execution of a trade, discovery of a counterparty, and the like) such that the workload only completes execution if the set of policies are satisfied. A policy could state, for example, that no trades may be executed with a certain counterparty beyond a threshold volume per day, and trades with that counterparty would execute until the threshold volume value was reached for that day. In trading, and particularly high frequency trading where a trade is determined by an algorithm (i.e., based on a strategy dictated by a trader and/or trading organization), timing can be critical. Latency in communication networks and other IT infrastructure can allow faster traders to front run, which negatively affects outcomes for slower traders. A policy associated with a trading workload could call on an edge device to automatically test a network connection for latency (e.g., from the closest edge node to the IT infrastructure of the exchange) and execute a trading workload only if latency is below a threshold value. Other example policies include counterparty blacklists, counterparty whitelists, asset blacklists, asset whitelists, buying an asset only when the price of that asset is in a specified range, only trading when volatility is below a specific threshold, only trading when market liquidity is above a specific threshold, only trading certain times of day, only trading when likelihood of execution is above a threshold value, and many others.

In embodiments, the market orchestration system platform 20500 may provide access to and/or integrate artificial intelligence system, which may be configured to recognize and/or understand the stage of a marketplace and automatically output a set of control instructions related to configuration of the marketplace based at least in part on the recognized and/or understood stage, including any of the parameters of configuration of the marketplace or any other marketplace parameters noted throughout this disclosure.

In some embodiments, the marketplace stages may be defined by economic cycle theories (e.g., Kondratiev Wave, Elliott Wave Supercycle, and many others).

In some embodiments, the marketplace stages may include the following stages: a new marketplace stage, a growth marketplace stage, a mature marketplace stage, and a distressed marketplace stage. In these embodiments, a new marketplace stage may describe the state of a marketplace that has just been launched. A new marketplace stage may have extremely low transaction activity and/or number of participants. A growth marketplace stage may describe the state of a marketplace where the number of participants and/or the number of transactions are rapidly increasing. A mature marketplace may describe the state of a marketplace where the number of participants and/or the number of transactions have stabilized. A distressed marketplace may describe the state of a marketplace where the number of participants and/or the number of transactions are decreasing.

In embodiments, an artificial intelligent services system 20243 receives an intelligence request and any required data to process the request from the market orchestration system platform 20500. In response to the request and the specific data, one or more implicated artificial intelligence system perform the intelligence task and output a classification (e.g., a classification of a marketplace stage) and a set of control instructions for the market orchestration system platform 20500 based on the classification. In some examples, the set of control instructions for new marketplace stage classifications and/or growth marketplace stage classifications may include deploying an intelligent agent that automatically generates small transactions to maintain transactional activity, deploying an offering engine that orchestrates participation by parties in other similar markets, deploying an engine for dynamically pricing transactions that decreases trading fees, deploying an intelligent agent to promote engagement by low-activity accounts, deploying an engine for automatically discovering and linking offerings from other marketplaces for presentation in the marketplace, deploying an engine for automatically increasing party engagement (such as by incentives for first trades), adjusting various marketplace configuration parameters, and many others. In embodiments, the set of control instructions for mature marketplace stage classifications may include deploying an engine for dynamically pricing transactions that increases trading fees, detecting distribution of executed trades by IP address and/or party relative to a theoretical “fair” distribution to identify competitive execution advantages and apply automated delay to a subset of trades by that address and/or party, deploying an intelligent agent to promote engagement by low-activity accounts, automatically pricing and/or eliminating inactive accounts, deploying a governance engine that dynamically imposes trading limits on parties, adjusting marketplace configuration parameters to optimize marketplace efficiency, deploying a gamification engine to promote engagement by accounts (e.g., reward animations, emphasis on trending assets, lottery incentives, visual and/or auditory feedback rewarding users with color, movement, and sound, badges, haptics, points, rankings, gamified imagery, charms, and the like) and many others. In embodiments, the set of control instructions for distressed marketplace stage classifications may include managing the termination of the marketplace, transforming the marketplace (e.g., by offering a new product or service), and many others.

In some examples, the intelligent services system 20243 may receive data from various sources described throughout this document and the documents incorporated by reference herein and may generate a set of feature vectors based on the received data. The intelligent services system 20243 may input the set of feature vectors into a machine-learned model (e.g., using a combination of simulation data and real-world data) to categorize or classify marketplace stage and generate a set of control instructions based at least in part on the marketplace stage classification by a set of human experts (such as by the user) and/or by the other systems or models. Data sources and feature vectors used for the categorization or classification of marketplace stage and the generation of control instructions may include user activity data, user profile data, transaction data, marketplace age data, as well as external data sources (transaction data relating to similar marketplaces or user data relating to similar marketplaces), and many others. Such artificial intelligence systems used for classification or categorization and/or generation of control instructions, in the present example and other examples described herein, may include a recurrent neural network (including a gated recurrent neural network), a convolutional neural network, a combination of recurrent neural network and a convolutional neural network, or other types of neural network or combination or hybrid types of neural network described herein or in the documents incorporated by reference herein.

Continuing the example, the intelligent services system 20243 may receive an intelligence request and marketplace age data, marketplace participant data, and marketplace transaction data from the market orchestration system platform 20500. In response to the request and the received data, the artificial intelligence system may classify the marketplace as a new marketplace stage and may then, based at least in part on the new marketplace stage classification, output a control instruction to the market orchestration system platform 20500 to use an engine for dynamically pricing transactions to decrease trading fees.

In embodiments, the market orchestration system platform 20500 may provide access to and/or integrate artificial intelligence system, which may be configured to recognize and/or identify indicators of poor health in a marketplace and automatically output a set of control instructions related to configuration of the marketplace based at least in part on the recognized and/or identified indicator(s) of poor health to mitigate the identified issue(s), including any of the parameters of configuration of the marketplace or any other marketplace parameters noted throughout this disclosure.

In some examples, a poor health indicator may include a significantly increasing average time between transactions over time and mitigation may include deploying an intelligent agent that automatically generates small transactions to maintain market activity.

In some examples, a poor health indicator may include an increasing concentration of sales by a particular seller or buyer (i.e., a cornered market), and mitigation may include deploying a governance engine that dynamically imposes trading limits on parties and/or deploying an offering engine that orchestrates participation by parties in other similar markets.

In examples, a poor health indicator may include large amounts of buy-side and sell-side activity by related entities (i.e., churn), and mitigation may include deploying an engine for dynamically pricing transactions that increases trading fees in cases where volume of counter-positioned trades is high.

In examples, a poor health indicator may include the simultaneous selling and buying of the same asset(s) to create misleading or artificial activity in the marketplace (i.e., wash trading), and mitigation may include suspending user accounts of involved entities and/or notifying regulatory authorities.

In examples, a poor health indicator may include the presence of large numbers of inactive or barely active accounts and mitigation may include automatically pricing and/or eliminating inactive accounts, deploying an intelligent agent to promote engagement by low activity accounts, and/or deploying a gamification engine to promote engagement by accounts (e.g., reward animations, emphasis on trending assets, lottery incentives, visual and/or auditory feedback rewarding users with color, movement, and sound, badges, haptics, points, rankings, gamified imagery, charms, and the like).

In examples, a poor health indicator may include an absence of new offerings and mitigation may include deploying an engine for automated discovery and linking of offerings from other marketplaces for presentation in the marketplace.

In examples, a poor health indicator may include an absence of new sellers and/or buyers and mitigation may include deploying an engine for automated party recruitment (such as incentives for first trades).

In examples, a poor health indicator may include an absence of new sellers and/or buyers and mitigation may deploying an engine for automated party recruitment (such as incentives for first trades).

In examples, a poor health indicator may be detected distribution of executed trades by an IP address and/or party relative to a theoretical “fair” distribution (i.e., front running) and mitigation may include applying an automated delay to a subset of trades by the IP address and/or party such as to restore a theoretically "fair" distribution.

In some embodiments, the intelligent services system 20243 receives an intelligence request and any required data to process the request from the market orchestration system platform 20500. In response to the request and the specific data, one or more implicated artificial intelligence system perform the intelligence task and output an identification (e.g., an identified poor health indicator) and a set of control instructions based at least in part on the identification for the market orchestration system platform 20500.

In examples, the intelligent services system 20243 may receive data from various sources described throughout this document and the documents incorporated by reference herein and may generate a set of feature vectors based on the received data. The intelligent services system 20243 may input the set of feature vectors into a machine-learned model (e.g., using a combination of simulation data and real-world data) to identify poor health indicators of a marketplace and to output a set of control instructions by a set of human experts (such as by the user) and/or by the other systems or models. Data sources and feature vectors used for identification of poor health indicators and generation of control instructions may include user activity data, user profile data, transaction data, transaction timing data, marketplace age data, trade distribution data (by party, IP address, or the like), offering data, as well as external data sources (transaction data relating to similar marketplaces or user data relating to similar marketplaces), and many others. Such artificial intelligence systems used for identification and control instruction generation, in the present example and other examples described herein, may include a recurrent neural network (including a gated recurrent neural network), a convolutional neural network, a combination of recurrent neural network and a convolutional neural network, or other types of neural network or combination or hybrid types of neural network described herein or in the documents incorporated by reference herein.

For example, the intelligent services system 20243 may receive an intelligence request and marketplace offering data from the market orchestration system platform 20500. In response to the request and the received data, the artificial intelligence system may generate an identification of a poor health indicator (such as an absence of new offerings) and may then, based at least in part on the identification, output a control instruction to the market orchestration system platform 20500 to deploy an engine for automated discovery and linking of offerings from other marketplaces for presentation in the marketplace.

In embodiments, a "bet-on-anything" prediction marketplace may be configured to enable the trading of instruments related to the occurrence of an event, satisfaction of a condition, or the like. In embodiments, events may include real-world events (e.g., weather, the passage of legislation, the winner of a baseball game, judicial outcomes, and many others) and/or digital events (e.g., the winner of an online chess match, the occurrence of an event in the metaverse, the outcome of a simulation, the outcome of an electronic gaming event, and many others). In embodiments, the prediction marketplace may be governed by smart contracts. In embodiments, the smart contracts may be based on the occurrence of an event, the satisfaction of a condition, or the like. In embodiments, the prediction marketplace may place wagering limits for trades relating to particular events or conditions. In embodiments, the prediction marketplace may generate multiple variations of the same bet, allowing users to increase their bets where wagering limits are in place. In embodiments, users of the prediction marketplace may generate instruments that are the subject of trading. In embodiments, the prediction marketplace may leverage digital oracles to serve as external data providers to the prediction marketplace.

In embodiments, the prediction marketplace includes a system configured to prevent trading on specific topics (e.g., terrorism, crime, war, natural disaster, disease, or the like) and/or leverages intelligent services system 20243 (such as artificial intelligence system, RPA module, and/or NLP module 8824) to prevent trading on specific topics.

In embodiments, the market orchestration system platform 20500 may be configured to provide aggregation services, validation services, valuation services, recommendation services, smart contract services, and/or the like for market orchestration of various classes of distributed and/or underutilized assets, resources, capabilities, services, and the like. For example, such classes may include personal capital, energy resources, used material, used goods, excess finished goods, excess unfinished goods, excess manufacturing capacity, and many others.

In embodiments, the market orchestration system platform 20500 includes a system configured to provide autonomous identification and valuation of a set of inventoried items held by a set of owners.

In embodiments, the market orchestration system platform 20500 includes a system configured to provide autonomous negotiation and contracting for aggregated assets.

In embodiments, the market orchestration system includes a system configured to provide recommendations for value-added upgrades (e.g., manufacturing capabilities).

In embodiments, the market orchestration system platform 20500 includes a system for providing real-time monitoring.

In embodiments, the market orchestration system platform 20500 includes or integrates with a set of edge devices for validation, monitoring, management, or the like of parties, assets, transactions, or the like. Market orchestration of stranded and/or distributed tangible assets may require "trusted" validation and/or authentication for both participants and assets. Validation may help ensure that buyers, sellers, traders, and the like meet financial, legal, regulatory, and other requirements necessary to participate in a particular market. Validation may also help ensure the value of a commodity (such as a raw material), semi-finished goods, finished goods, capabilities (such as a manufacturing capability, a 3D printing capability, or the like), and may others. Validation may also be used to monitor and report participant data that may be analyzed to autonomously facilitate or recommend certain transactions or market opportunities.

In embodiments, validation of market participants and/or assets may be accomplished by biometric authentication, peer and customer reviews, quality measurements, inventory control systems, and many others. For example, biometric authentication could be used to validate the identity of users participating in a sports betting marketplace (such as to validate the age of participants to meet regulatory requirements) or to validate the identity of users participating in a professional services marketplace (such as to validate the credentials of participants). In embodiments, biometric authentication may be accomplished by retina scanners, fingerprinting, facial recognition, voice recognition, and many others. Peer and customer reviews may be used, for example, to validate a supplier of goods or services. In embodiments, peer and customer reviews may be based on satisfaction with contract completion, social media posts, and many others. In embodiments, such peer and customer review data could be gathered using automated satisfaction polling. Quality measurements may be used, for example, to determine the quality of materials produced and/or received. Quality measurements may include tolerance measurements, machine vision observations and/or measurements, image recognition, statistical analysis, certificates of conformity, and many others. Inventory control systems may be used, for example, to track component parts for a product and to report component part inventory as a market orchestration participant. In embodiments, inventory control systems include QR codes, bar scanners, RFID devices, image recognition systems, AI-enhanced inventory control tools, various control software that could utilize SDKs or other means to integrate specially configured modules that enable use of inventory control systems with the market orchestration system platform 20500, and many others. In examples, footage from a drone may be processed by image recognition software to identify excess valuable timber tracts, including the specific tree species and sizes, and the timber tracts may be automatically listed for sale in a marketplace.

In embodiments, systems and methods for validation of market participants and assets (such as by using biometric authentication, peer and customer reviews, quality measurements, inventory control systems, and many others) may be used to generate a measure of risk related to a party, an asset, a transaction, or the like. For example, social media reviews for a business may be analyzed to generate a measure of risk related to transacting with that business.

In embodiments, the market orchestration system platform 20500 may use a machine learning system and/or artificial intelligence system, such as machine learning system and/or artificial intelligence system included in the intelligent services system 20243, for identification of distributed asset classes and capabilities, aggregation of demand and/or supply, provision of transaction recommendations, and many others. More specifically, machine learning and/or artificial intelligence may be used for mining areas of opportunity based on existing or enhanced subscriber capabilities, generating recommendations, generating predictions (e.g., facilitating ad hoc marketplace creation and management by identifying resources to meet predicted needs that could not otherwise be met due to material shortages, logistics constraints, or the like), negotiating, business planning, smart contracting (such as machine-to-machine negotiation and/or smart contracting), and many others.

In embodiments, the machine learning and/or artificial intelligence systems of the intelligent services system 20243 may be integrated or otherwise connected to a gaming engine. For example, the machine learning and/or artificial intelligence systems integrated with a gaming engine may be configured to choose the amount of raw material to be purchased for manufacturing an order, wherein the purchase of certain excess material could be justified because a quantity discount applies and because there is a market opportunity to immediately sell the excess material to a nearby company in an unrelated business sector.

In embodiments, the market orchestration system platform 20500 includes an authentication system for authenticating marketplace participants (e.g., buyers, sellers, regulators, and the like). The level of authentication required may depend on the marketplace attributes. For example, marketplaces for very expensive (e.g., spaceflight reservation), dangerous (e.g., hazardous chemicals), age-restricted (e.g., alcohol), and/or closely regulated products, services, and/or experiences may require extensive buyer and/or seller authentication. In embodiments, the authentication system may use biometric authentication, password-based authentication, two-factor authentication, multifactor authentication, token-based authentication, certificate-based authentication, transaction authentication, computer recognition authentication, CAPTCHAS, single sign-on, and the like to authenticate marketplace participants and other platform users.

In embodiments, the platform includes a market liquidity system for managing marketplace liquidity. In embodiments, the platform may enable high value marketplaces to be combined or bundled with lower value marketplaces to enable liquidity of marketplace activities.

In embodiments, the market orchestration system platform 20500 may support aggregated consumer grouping of unaffiliated consumers based on a confirmed, inferred, and/or predicted product and/or service need. In embodiments, the platform may be configured to identify a product and/or service need, identify consumers in close proximity to one another that have the product and/or service need, identify providers (e.g., service providers, manufacturers, or the like) that are able to fulfill the product and/or service need, and identify a timeline for transaction settlement (e.g., delivery of a product or timing of a service) that would fulfill the product and/or service need of the aggregated consumer group.

For example, if a drought affects a region and water restrictions are imposed, unaffiliated residents of that region may independently begin buying drip irrigation components. The platform may detect this purchasing trend (e.g., through point-of-sale data or the like), identify the parties providing the drip irrigation components most in demand, and configure a bulk purchase of these components for the unaffiliated grouping of residents from the region. The platform may configure the details of such a purchase, including any smart contract terms governing the purchase (e.g., purchase amount, deposit, delivery details, division of product details, and the like). Continuing the example, the delivery could be made to a locker-type storage facility for individuals to retrieve at their own convenience.

Gaming Engine Platform Embodiments

A gaming engine smart contract process and related technologies now will be described more fully hereinafter with reference to the accompanying drawings, in which illustrative embodiments are shown. The gaming engine smart contract process and technologies may, however, be embodied in many different forms and should not be construed as limited to the embodiments set forth herein; rather, these embodiments are provided so that this disclosure will be thorough and complete, and will fully convey the scope of the disclosure and inventions to those skilled in the art. The gaming engine smart contract process may use an integrated gaming engine and distributed ledger platform or system that utilizes blockchain technology for storing gaming engine-integrated smart contracts and providing convenient and secure control of the smart contracts.

A platform that comprehensively integrates the capabilities of both gaming engines and smart contracts offers benefits of security, flexibility, and automation for transaction counterparties, applicable to a wide range of markets and use cases. These use cases include existing gaming engine use cases, such as physics simulations, cinema, and media content production, where smart contracts can be integrated with gaming engines to enable more sophisticated transactions, such as involving sets and series of conditional triggers, within the environments created by a gaming engine. Likewise, existing smart contract applications, such as for handling exchanges of cryptocurrency or other digital tokens, for enabling microtransactions of all types (including lending and insurance, among many others), and the like, can be enhanced by the introduction of features and dynamics facilitated by gaming engines, including high-quality visualization, customization, and simulation of transaction features and environments. In addition, other emerging transaction environments, such as AI-driven digital twins, mixed reality environments, and intelligent wallets may incorporate integrated gaming engine and smart contract features with other features and capabilities to enable entirely novel transaction experiences.

A Platform for Integrating a Set of Gaming Engines and a Set of Smart Contract Services in a Common Execution Framework is provided in some embodiments.

Referring to FIGS. 209A, 209B, 209C, 210, and 211, a gaming engine smart contract executing platform 20900 is configured to enable methods and systems for integrating gaming engine and smart contract services in a common execution framework. For example, the execution framework may be common to different services or systems when the different services or systems input and/or output similarly formatted data, share and/or manipulate similarly formatted data, perform steps of an algorithm with consideration of steps performed by the other system or service, or when other framework elements are common between the systems or services. A gaming engine smart contract is a smart contract that is developed, configured, managed, and/or executed within a gaming engine. A gaming engine is a software development environment and architecture that provides a set of predefined tools for digital content developers such as physics, rendering, AI, collision detection, scripting, inputs, and the like without the need to program them. Gaming engines may be designed or optimized to run on any combination of GPUs, CPUs, or other computing devices. Gaming engines may be developed for general-purpose applications, optimized for a special-purpose development environment, or structured to enable a general-purpose set of applications that can be expanded via additional modules.

The platform 20900 includes a gaming engine system 20902 configured to facilitate configuring gaming engine services and smart contract services in response to client requests. A client may be a user, another computer program or function, or some combination of the two that request and receive Platform services. Gaming engine services refer to a capability provided by a gaming engine or gaming engine set such as rendering, visualization decision-tree analyses, physics, or other more specialized applications. One or more gaming engine services may be employed and/or deployed by the platform 20900 via one or more gaming engine modules.

In some embodiments, the platform 20900 is configured to provide applied gaming engine services, including gaming smart contract execution services. Smart contract services refer to tools, analyses, processing, monitoring, intelligence, etc. provided for the development, management, and execution of smart contracts.

In some embodiments, the gaming engine system 20902 includes gaming engine configuration services 21030 configured to provide, among other things, configuration of gaming engines including one or more gaming engine modules per the client requests, such as by application of gaming engine module configuration services 21030 that may rely on gaming engine module analysis services 21034 to facilitate selection and architecting of gaming engine modules that may be retrieved from a gaming engine module library 21032.

In some embodiments, the gaming engine system 20902 may include a smart contract system 21040 that may facilitate configuring smart contracts, such as contracts from a smart contract library 21042 with a contract configuration service 21044. The contract configuration may be automated and/or user-interactive (e.g., semi-automated, guided, free form entry, and the like) using, for example, renderings, visualizations or other means for contract term/segment review, selection, approval, and the like. The smart contract system 21040 may include a smart contract management service 21046 configured to manage the configured contracts, contract modules, contract elements, and the like.

In some embodiments, the gaming engine system 20902 includes a gaming engine application management capability 21010 configured to provide application of the smart contract system 21040, the gaming engine configuration service 21030 individually, and/or in various combinations. As an example, a gaming engine application management system 21010 may select and execute a gaming engine application from, in embodiments, a gaming engine application library 21020. The gaming engine application library 21020 may, for example, store validated gaming engine applications and their associated smart gaming engine contracts. Gaming engine applications refer to software applications that use a gaming engine to deliver gaming engine services in accordance with a gaming engine smart contract. The gaming engine application management system 21010 may be configured to work with the gaming engine configuration service 21030 and with the smart contract system 21040 to identify and/or develop and validate a gaming engine services/smart contract set for use with, for example, a gaming engine application. The gaming engine application management system may further develop a gaming engine application using a validated gaming engine service/smart contract set.

In some embodiments, the platform 20900 includes an intelligence layer 21100. The intelligence layer may include an intelligence layer controller 21110 configured to coordinate intelligence layer interaction with various platform elements and sub-elements such as the gaming engine system 20902. The intelligence layer controller 21110 may perform coordination operations through an analysis management module 21116 that may interact with analysis modules 21112 and a governance library 21114. In embodiments, the intelligence layer 21100 may further include a plurality of artificial intelligence services 21120. These services may include artificial intelligence services with capabilities such as machine learning 21122, rules-based systems 21132, robotic process automation 21128, digital twins 21126, machine vision 21130, Natural Language Processing 21134, neural networks 21124, an analytics system 21136, and/or an intelligent agent module 21138. The services may be configured to communicate with one another to facilitate analyses, decisions, recommendations, and the like associated with aspects of development and execution of gaming engine smart contracts. The automation of intelligence services such as artificial intelligence services may include, for example: automated smart contract code development, contract parsing, contract element selection and assembly to produce a complete contract, contract execution feedback and learning, selection of gaming engine tools for contract verification, and the like.

In embodiments, the intelligence layer 21100 may be configured to automatically monitor smart contract execution and provide alerts and notifications associated with contract terms, governance, fraud, and others. For example, the governance library 21114 may be configured to facilitate determination of fairness, regulatory conformance, determination of contract terms compliance, and the like.

In embodiments, the intelligence layer 21100 may be configured to communicate with one or more other systems of the platform 20900 and thereby facilitate performance of tasks related to categorizing and grouping smart contract transactions, contract types, clients associated with certain contracts, maintaining, updating, and organizing libraries based on contract outcomes, such as by using similar transaction data to parse contract requests into an executable contract, and the like.

In embodiments, the digital twin system 21126 may include a digital twin library that can be developed and maintained for smart contract elements and assemblies for use with a range of intelligence services, including various analysis capabilities.

In some embodiments, the platform 20900 includes a data processing service 20930 in communication with a plurality of systems of the platform 20900 and configured to provide shared data processing, storage, and libraries to the plurality of systems. The data processing service 20930 may be configured to facilitate acquisition and sharing of real-time data from integrated external systems, performance of calculations, associated intelligence layer client requests, and the like. The data processing system 20930 may also process and manage data associated with the full range of transactions required for smart contract transactions, including data integration for one or more simultaneous systems. In embodiments, the data processing system may include one or more of data processing services 20931, data handling services 20932, data stores 20933, and libraries 20934.

In some embodiments, the platform 20900 includes an analytics and reporting system 20940. The analytics and reporting system 20940 is configured to provide analytic services to platform elements, such as the intelligence layer services 21100, smart contract system 21040, gaming engine system 20902, gaming engine configuration service 21030, and others. In embodiments, the analytics and reporting system 20940 may include database search services 20941, monitoring and notification services 20942, marketing, advertising, research services 20943, and the like. These ancillary analysis and reporting system 20940 services may be utilized by or in association with other platform capabilities, such as a smart contract monitoring capability.

The platform 20900 may further include distributed ledger services 20950, such as block chain smart contract transaction services 20951, blockchain smart contract management services 20952, and a range of other distributed ledger transaction services 20953.

In addition to these function-oriented systems, the platform 20900 may include platform-wide services and systems, such as an interface system 20980 that may provide user interface (e.g., GUI) functionality, software development kit capabilities, application programming interface (API) port support, and the like. Another platform-wide system is a communication system 20970 that may provide communication systems, data flow management and/or optimization, network management and the like. Yet another platform-wide system comprises a security system 20960 that may, among other things, provide authentication, monitoring, service and software access controls, and the like.

In some embodiments, the platform 20900 may be deployed in an environment, such as a networked environment in which a network 21070 may facilitate interoperation of the platform 20900 with external licensees and/or subscribers 21050 and external data and related services 21060. In embodiments, licensees and/or subscribers 21050 may interact with the platform within a software-as-a-service architecture, an embedded platform access architecture, and the like. Example licensees and/or subscribers 21050 may include enterprise resource planning system 21051, product lifecycle management system 21052, social media systems 21053, venues 21054, quantum computing systems 21055, underwriting systems 21056, auctioning services 21057, gaming systems 21058, entertainment systems 21059, and the like. In examples, the platform 20900 or portions or derivations thereof (e.g., a gaming engine smart contract execution framework) could be incorporated into a social media application that allows users to subscribe to immersive visual content that is tailored to their requirements and is executed and paid for in the context of a gaming engine smart contract. The same approach could be applied to any industry that can benefit from tailored proposals, visualization, and provision of services. Examples include insurance systems, IoT systems, 3D printing systems, and the like.

In embodiments, external data and related services 21060 may include, without limitation, regulatory systems 21061, sensor and vision systems 21062, blockchain systems 21063, quantum computing systems 21064, data servers and services (e.g., public data sources, private data sources, corporate sources and services), and the like. In embodiments, external data and related services 21060 may refer to external data sources, computing services, service provider equipment, and so forth that may interact with, be required, or used to provide platform 20900 services. These external services, data sources, entities, and associated data may be integrated using, for example, combinations of the communications system 20970, the security system 20960, the interface system 20980, and the like.

Referring to FIG. 212, a cloud-based embodiment 21200 of the platform 20900 is depicted. The gaming engine and smart contract services, including configuration, execution, analysis, management, and the like, may be offered as a set of services that could be integrated into cloud-based computing systems. The platform services may be accessed as cloud-based services and data required for use and produced by the platform (e.g., integrated smart contract gaming engine integrations) may be accessible as cloud-based data. Platform licensees and/or subscribers 21220 may access the platform services and data remotely through a range of application-targeted systems, including mobile devices, portable devices (e.g., laptop devices and the like), and the like. In addition to being accessible as cloud-based data, deliverables of the platform, including deployable gaming engine-based smart contracts and the like may be delivered to platform licensees for execution on local systems, such as corporate computing systems (e.g., cloud-based, and the like).

In the architecture of FIG. 212, local data and services 21210 may be accessed by and/or provide resources to the platform through a variety of configurations, including peer-to-peer computing architectures, distributed storage and computing services, data acquisition systems, and the like. Resources may include smart wallets, machine vision systems, industrial internet of things sensor systems, and the like.

In embodiments, the platform 20900 can be deployed as part of a stand-alone device such as a kiosk with intermittent network communication, as part of a network of connected devices such as a robot fleet with shared computing and storage resources, or as a cloud-based distributed service such as VR gaming or visualization, or any combination of these or other deployment targets. While each type of platform implementation may require similar basic capabilities provided by platform elements (e.g., intelligence layer 21100, data processing system 20930, etc.), the level of functionality may vary depending on hardware, processing power, connectivity, security requirements, governance, and the like. In embodiments, the platform 20900 may be licensed or subscribed to using a software as a service (SaaS).

FIG. 213 illustrates an embodiment of the gaming engine system. The gaming engine system works with other platform elements during all phases of operation. For example, the smart contract configuration portion of the gaming engine system may work with the digital twin AI service in the intelligence layer to evaluate various gaming engine/smart contract outcomes that are presented to a client prior to smart contract finalization. In embodiments, the gaming engine system includes the gaming engine configuration service system 21030, the smart contract system 21040, the gaming engine application management system 21020, and the gaming engine application library 21020.

In embodiments, the gaming engine system works with the intelligence layer to ensure that smart contracts are managed in accordance with regulatory requirements. In examples, the platform may receive a client request to produce highly detailed renderings of a secure government site. In this case, the gaming engine smart contract analysis module performs an initial compliance screening using the intelligence layer controller and its associated governance library. The potential transaction is flagged as illegal, causing the platform to deny or suggest an alternative to the client request. The gaming engine system works with the intelligence layer and the analytics and reporting system to identify and report fraudulent/anomalous activity at any stage of smart contract development and execution. For example, trend analyses may compare a generalized set of historical data associated with the same or similar contracts, and flag anomalies. The gaming engine system works with the intelligence layer to implement learning and optimization based on a database of generalized gaming engine smart contract outcomes. This capability can be used to optimize libraries, inform marketing and sales activities, provide client options, and so forth.

FIG. 214 illustrates an exemplary gaming engine and smart contract execution workflow. The gaming engine system forms the core of platform functionality. The gaming engine system configures gaming engines and smart contracts in response to client requests and when necessary, provides applied gaming engine services, including gaming smart contract execution. A gaming engine may incorporate one or more smart contract segments comprising a single contract whose terms and programs are developed autonomously or in combination with a user interface, where the output satisfies all parties and is in compliance with existing standards. A gaming engine may comprise multiple gaming engine modules working collectively to deliver a service. Execution of a gaming engine smart contract involves data gathering and analysis to validate contract execution according to agreed terms and compliance requirements. Transactions and contract records may be managed using a blockchain distributed ledger.

FIG. 215 illustrates a client service request flow overview. The gaming engine application management is activated following a client services request, where depending on the type of request, it may (1) select and execute a gaming engine application from a library, (2), with help from the gaming engine configuration service and the smart contract system, identify and/or develop and validate a gaming engine service/smart contract set for use with a gaming engine application, and (3) develop a gaming engine application using a validated gaming engine service/smart contract set. Gaming engine smart contracts may be executed locally, in distributed fashion, or using cloud-based services. Gaming engine smart contract segments may be separately executed by one or more appropriate subsystems. For example, one segment may initiate a contract element with a robot fleet to perform a service, a second portion of the contract may initiate a gaming engine service that uses external data inputs to perform renderings for verification of contract progress, and a third portion of the contract initiates a cloud-based distributed ledger system that manages verification data and handles blockchain-based transactions. Transactions may include automatic payments through smart wallets that are included in the contract and are part of the blockchain distributed ledger.

The gaming engine application library stores validated gaming engine applications and their associated smart gaming engine contracts. As shown in FIG. 215, the library may be expanded when gaming engine service/smart contract sets are identified and developed into a gaming engine application.

Referring back to FIG. 213, the gaming engine module library contains a range of gaming engine modules for general-purpose or specialized applications. Example special-purpose modules include training, auctions, insurance, etc. A library index maintains and optimizes live sets of associations between various gaming engine modules and related smart contract library segments that together comprise valid gaming engine service/smart contract sets. The index may be expanded as necessary based on learning, expert input, machine learning, etc. The module library and its associated index can also be used with the smart contract system to assemble and configure valid gaming engine service/smart contract sets when validated sets are not available for a client service request.

Smart contract rendering is provided in some embodiments.

Smart contract rendering refers to the capability of a gaming engine to produce realistic images, animations, and similar visual representations of objects and events in real/near-time. Rendering capability can be used in all phases of contract development, execution, and client service delivery. Examples: through a GUI, gaming engine rendering services may provide gaming engine rendering visualization for a human user that illustrates steps and activities in a proposed contract and automatically update content to match modification of contract elements until a suitable agreement is reached. In a similar fashion, gaming engine rendering services could provide either contract deliverables or verification and blockchain data for contract execution. The gaming engine library may contain one or more gaming engine modules dedicated to rendering or may use a portion of the base general-purpose gaming engine that contains rendering services.

Visualizations in a smart contract gaming engine are provided in some embodiments.

Smart contract gaming engine visualization is like gaming engine rendering; However, rather than producing realistic renderings, the gaming engine produces visualizations of processes, event sequences, assets, relationships, value chain network entities, and related future outcomes, movements, etc. For example, a visualization might include a process flow diagram for a series of proposed contract outcomes, displayed to show adjustments as new contract execution data and inputs are received. The gaming engine module library may contain one or more modules dedicated to visualizations or may use a portion of the base general-purpose gaming engine that contains visualization services.

Figure 6:
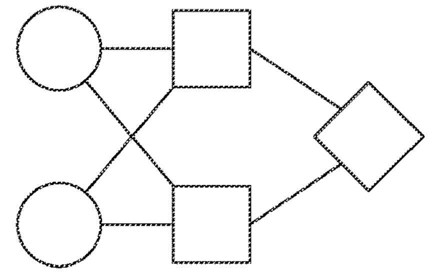
Figure 7:
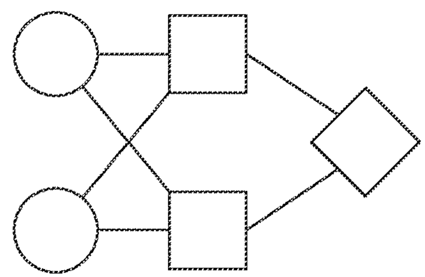
Figure 8:
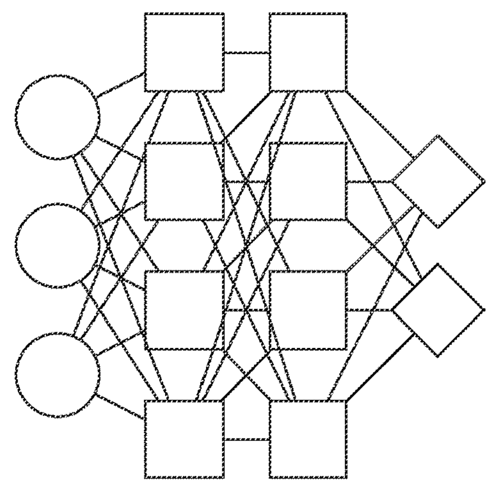

FIGS. 216A and 216B illustrate a gaming engine/smart contract set flow. Gaming engine module analysis coordinates activities and analyses within the gaming engine configuration service, with the smart contract system, and with other platform elements such as the intelligence layer. FIG. 6 below illustrates an example process flow, where gaming engine module analysis manages the process of identifying a set of gaming engine modules that are compatible with a gaming engine smart contract set in response to a client request.

In examples, the client is a PLM system that incorporates an embedded version of the platform. A product management team wishes to use the PLM system to cost, visualize, and enact one or more scenarios associated with the worldwide recall of over one million faulty electric motors. The PLM system calls on the platform to provide a service that uses gaming engine visualization and costing for various scenarios that may include any combination of free return shipping with new replacement, same-day repair at a regional service center, new replacement with local recycling or landfill of the returned motor, and so on. Gaming engine module analysis determines that platform libraries do not contain a valid gaming engine service/smart contract set that meets client criteria, which triggers an iterative contract configuration sequence where smart contract segments are sourced, configured, assembled, and simulated until a valid set is identified, added to the smart contract library, and indexed with the gaming engine module library. Gaming engine module analysis continues until there is a valid gaming engine service/smart contract set established for delivery of client services. Example contract segments may incorporate local landfill, shipping, labor rates, distribution concentrations of faulty motors, validation of return or repair, reimbursement transactions, risk, liability, and so on. The selected gaming engine service/smart contract set(s) are provided to the PLM system for access by the client for downstream gaming engine applications. After the product team reviews scenario visualizations and costs, they may choose to initiate one or more of the smart contract sequences to automatically complete and document this PLM process.

Gaming engine module configuration works with the gaming engine smart contract system to configure selected gaming engine modules for use with a smart contract set. Gaming engine module configuration may adjust, modify, specify, or otherwise configure a gaming engine for execution with a smart contract set. For example, certain variables or options may be specified by a platform licensee or subscriber, or other operating characteristics may be optimized for a host processing and communications system. Gaming engine module configuration assembles and sequences modules, determines required operating sequences in association with the smart contract management module, and coordinates inputs, including with external data and systems.

Smart contract systems are associated with the gaming platform in some embodiments.

The platform incorporates a smart contract system that is used to select and/or develop a gaming engine smart contract(s) that meet client requirements, adhere to foreseeable compliance requirements, include means and criteria for validation, incorporate terms and conditions, and provide for a digital ledger system (blockchain or other) to manage transactions and associated recordkeeping (see FIG. 213). The smart contract system comprises a smart contract library containing predefined contract segments, contract configuration that manages tasks associated with contract parsing, assembly, and simulation, and related contract development tasks, and contract execution that works within a gaming engine application to handle contract verification, transactions, contract data, and linkages to external systems required for execution.

Configuration and management systems associated with a gaming engine platform are provided in some embodiments.

Contract configuration may be automated or user-interactive, where renderings, visualizations, or other means provide abstracted or actual contract segments for review. With coordination from gaming engine module analysis, assistance from the intelligence layer, and access to external data and services, the contract configuration system parses the client request to identify contract segments (existing code) that can be assembled to form a complete gaming engine smart contract that works with a defined set of gaming engine modules. The contract configuration system may also include the capability to automatically develop and validate new smart contract code and incorporate it into a gaming engine smart contract. The contract configuration system may provide the means to develop and validate new code through the interface system. This could be an important capability of a licensed platform implementation embedded as part of another system or service, for example, social media, PLM systems, auctioning systems, etc. With assistance from the intelligence layer and gaming engine module analysis, the configuration system develops and simulates gaming engine smart contract options. Selection and approval of the final contract configuration may be autonomous or require client approval through the interface system. In examples, user presentation could take the form of an updated version of the original contract input request. The contract configuration system works with the intelligence layer to provide governance oversight throughout the contract configuration process.

Simulation systems associated with a gaming engine platform are provided in some embodiments.

Simulation systems comprise various working combinations of platform elements that provide the means to simulate any aspect, phase, or type of smart contract input, configuration, or execution. Simulation systems may include the use of digital twins configured for predictive or real-time analyses that aid with contract development, execution, and machine learning. Simulation may employ various gaming engines as embedded filters or processors that aid with the process of decision-making. Simulation systems may be configured to interact with end users to display contract options, deliverables, and so forth. Simulation systems can be optimized for specific industries, use cases, etc. Examples include simulations for insurance, tax consequences, hazardous disposal fees, and so on.

A suite of AI tools is incorporated in the intelligence layer, where they are available to the smart contract system for tasks associated with smart contract development or execution. For example, the smart contract system may request assistance from the intelligence layer NLP service to parameterize a voice mail message request for a smart contract service. In this case, the intelligence service output may be a list of phrases that represent proposed contract requirements that can be used by the contract configuration system for subsequent contract development.

Intelligent Agents

In embodiments, the platform 20900 may include an intelligent agent module 21138 configured to create, configure, and manage one or more intelligent agents. The one or more intelligent agents act as intermediaries on behalf of a platform client (or vice versa) to support or conduct various processes associated with gaming engine and smart contract development focused on matching specific client and platform capabilities and requirements with the desired/requested contract deliverable and/or gaming engine operations. This may involve matching existing contract elements and terms such as price, quality, specific industries and scenarios, and other business considerations. Although these capabilities are inherent in the intelligence layer, specific intelligence agents may be configured for certain transactions, specific users, select customers, etc. The intelligent agents may make decisions and/or perform one or more services based on an environment, user input, and experiences. The intelligent agents can autonomously gather information (e.g., on a regular, programmed schedule or upon being prompted by a user). Examples of tasks that the platform 20900 may perform via one or more intelligent agents include automating interactive and sophisticated processes, performing front office business operations, performing intelligent, contextual, updated client outreach, performing communication via email, text, other messaging platforms, performing negotiation, performing RPA assisted negotiation, provide negotiation terms and alternatives, performing full negotiation based on a gaming/logic engine, performing social media interaction, responding to client comments on social media, "liking" or otherwise interacting with relevant social media posts, performing content reposting and/or generation, improving end-user experience, monitoring and/or shadowing human-human exchanges, perform actions based human-human exchanges, preparing packages, accounts and/or loans for opening, delivering and/or interacting with off-channel content and/or services, automating accounting for transactions, automating execution, providing analytics that create sophisticated and accurate frameworks, automating pricing of cross-market products based on comparable prices for direct services from competitors, execution of contract terms, and the like. For example, the platform 20900 may employ an intelligent agent to perform mortgage cross-selling enhanced by IoT data, gaming engine operations, smart contracts, and AI. The intelligent agent may perform enterprise, churn prediction, and determine preventative negotiated rates to minimize customer loss. By way of another example, in a healthcare environment including regulations, insurance, and/or finance management, the platform 20900 may employ an intelligent agent to assist with determining and analyzing a choice of banks, bank accounts, and bank features, facilitate regulatory handoffs and self-validation. The intelligent agent may assist a service provider with a portal for deposits, withdrawals, and/or compliance reporting. The intelligent agent may merge health insurance claim streams with bank account activity data and user actions. The intelligent agent may facilitate creation and management of a health portal for a health insurance provider. The health portal may contain highly confidential information which may be managed via blockchain and/or distributed ledger. The intelligent agent may assist with bill payment services, such as by handling direct payments and/or automatic payments for approved claims. The intelligent agent may assist with add-on financial and/or investment services, such as HSA spending management. The intelligent agent may be configured to create and/or manage a smart wallet. The smart wallet may be configured to manage one or more actions related to a regulated HAS, such as policy and governance of data presentation, validation without invading privacy, and/or payments for health services.

In embodiments, the RPA module, coupled with intelligent agents, can automate interactive and sophisticated processes, as well as perform front-office business operations. As such, the RPA module can operate with high-intensity workloads that seamlessly integrate for improved end-user experience. The intelligent agents can work in synergy with other digital and automation technologies, such as IoT (Internet of Things) and analytics, to create sophisticated and accurate frameworks. For example, the platform 20900 may enable mortgage cross-selling enhanced by IoT data, smart contracts, gaming engine operations, and AI via the RPA module and the intelligent agent module. Thereby, the platform 20900 may perform enterprise, churn prediction, and predict preventative negotiated rates to minimize customer loss.

In embodiments, the platform 20900 may be configured to, via one or both of the RPA module and the one or more intelligent agents, dynamically optimize market conditions, such as prices, liquidity, availability, and the like of traded assets and/or currencies (cryptocurrencies, fiat currencies) based on real-time intelligence. For example, on the lending side, cost of acquisition of customers and type of loan and quality of underwriting (e.g., filters to the incoming funnel) can be adjusted based on current market conditions of those in the funnel (e.g., data from the funnel). Moreover, the need to discount the sale of servicing can be tied to the acquisition.

In embodiments, the platform 20900 may be configured to, via one or more intelligent agents, dynamically determine necessary resources to perform one or more operations based on real-time intelligence. The intelligent agent module 21138 may, via one or more intelligent agents and/or AI processes, determine one or more gaming engine configurations, gaming engine operations, smart contracts, smart contract libraries, intelligence layer services, and/or other intelligent agents that may be suitable to performance of a gaming engine operation and/or desired client operation. The one or more intelligent agents may automatically proceed with executing, ordering, and/or facilitating cooperation, integration, and/or operation of the determined resources to perform the desired gaming engine operation, smart contract operation, and/or client operation. For example, in response to a received or anticipated desired client operation, the one or more intelligent agents may determine that one or more of the digital twin system 21126, the machine vision 21130, and the rules-based system 21132 are necessary, desirable, and/or optimal for performance of the client operation. The one or more intelligent agents may additionally or alternatively determine one or more other intelligent agents and/or AI/ML systems that may also help or be necessary to performance of the client operation. The one or more intelligent agents may additionally or alternatively determine one or more resources within the gaming engine application library 21020 and/or the contract configuration module 21044 that may be applicable to or necessary to performance of the client operation.

In embodiments, the platform 20900 may be configured to, via one or more intelligent agents, dynamically recognize attention that is being paid to one or more assets within a gaming engine environment and/or an environment, market, and/or market ecosystem external to the gaming engine environment. Examples of assets include securities, digital assets, physical assets, services, goods, persons, personas, avatars, brands, and the like. The one or more intelligent agents may determine the attention to the one or more assets based on one or more external data and/or external services 21060, such as data related to personal attention, views, "clicks," attention of other intelligent agents, and the like. Upon determining the attention, the one or more intelligent agents may automatically propose and/or implement a response via the gaming engine system, such as by implementing a gaming engine smart operation with related smart contract functionality to capitalize on the asset that is receiving the attention.

Robot process automation (RPA) provides tools to deploy and manage software bots that emulate human interactions with digital systems and software such as understanding how to navigate systems, identify and extract data, and perform a wide range of defined actions. Robot process automation (RPA) is incorporated in the intelligence layer, where it is available to the smart contract system automating or facilitating tasks associated with smart contract development or execution. Specific RPA tools can be stored in a database for later retrieval or refinement.

Opportunity mining/discovery provides the automated capability to produce and/or assemble smart contract elements to deliver contracted services with the assistance of experts, RPA, machine learning, automated code development, or other methods. The smart contract system may also work with the intelligence layer to proactively develop smart contract configurations based on an anticipated need and opportunities identified using trend analysis or other data predictive tools.

Cython can be used to optimize individual or combined smart contract code elements. For example, it may use an RPA system or other AI tools, run Python programs, log performance statistics, identify computational choke points, identify C libraries that perform the same computations faster, and automatically annotate relevant portions of Python source code to render it into and/or parseable by Cython code. Cython can be used for the origination and/or integration of smart contract code segments that are sourced from existing libraries, code that is automatically developed by the smart contract configuration system, or code input through the interface system.

Verification associated with smart contracts and gaming engines is provided in some embodiments.

Contract management coordinates with contract configuration and other platform elements to validate and provide transactional support for gaming engine smart contract execution. Automatic verification of smart contract execution may be as simple as a user acknowledgment that a service has been delivered, or more complex where multiple and diverse mechanisms are employed, such as third-party compliance systems involving various types and locations of data, waiting for completion of another contract (external or sub-contract). Among other capabilities, smart contract gaming engines may provide a contracted service, and/or participate directly or indirectly in contract verification. Smart contract execution also requires a set of notifications that communicate with contract participants. These may include progress reports, renderings and visualizations through the interface system, payment notifications, notifications regarding contract problems or delays, and the like. Smart contract clients may include actual users, subcontractors, financial institutions, internal processors associated with execution of the contract, regulatory agencies, and the like. Smart contract execution provides tools to improve smart contract performance using a performance feedback/machine learning loop that works with the contract library. The contract execution system provides for real-time contract management and adjustment as far as it is possible within the smart contract/compliance context. The contract execution system works with the intelligence layer to provide governance oversight throughout the full contract execution process.

The smart contract library contains a set of validated smart contract segments and validated sets of assembled smart contract segments that can be used as building blocks, and a set of validated and complete gaming engine smart contracts. Working with the intelligence layer and smart contract configuration, the contract library may be expanded and improved. Working through the interface system and with the intelligence layer, new library elements may be created, validated, and included in the library. Working with the analytics and reporting system module that is focused on advertising, marketing, and research, the smart contract library may be configured to include one or more sets of contracts that may be proactively presented to a client for consideration. In a simple example, a client may request a contract for a house painting service. In response, the platform may provide a range of complete contract proposals provided by one or more paid advertisers/service providers. The library may be configured and organized to provide groups of contract segments and contracts to meet domain-specific, functional, or other requirements. Example groupings may include escrow services, events and experiences, data story development and delivery, training, auctions, etc. Several example descriptions are listed below as focus areas and shown in FIG. 4.

The smart contract system may configure and execute contracts and associated gaming engines directed to simulating various activities and maintaining records associated with training services such as certified training for professional qualifications, fitness training, hazardous materials handling training, etc. Smart contract training modules may be developed and/or stored in the contract library Product lifecycle management (PLM) comprises one or more tools (mostly software) used to plan and manage a product throughout its life, from initial specification and design, to manufacturing, to maintenance and updates, to eventual recycling or disposal. In many cases, PLM systems can track not just a type of product, but also a specific item. In the context of this disclosure, one or more smart contracts designed to assist with PLM services may be incorporated into the library, or conversely, the platform (or subset), plus a specific smart contract, and may be embedded in a PLM system. PLM example implementations may include contracted gaming engine simulations to evaluate design features, manufacturing methods, product costing and payment simulations, recycling scenarios and options, etc.

Data stories describe, illustrate, or otherwise provide detailed understanding regarding an area of interest, where available data is analyzed and presented for a specific audience or client. For example, a financial analysis evaluating different risk scenarios might employ a gaming engine for both simulation and visualization for a CFO. In this context, data stories may be provided as a service within the smart contract system, or possibly included with data analysis and reporting.

Gamification employs game design elements to improve user engagement, even in non-game contexts. Smart contracts with gaming engines may be used to provide this service, either on demand or as an embedded service for a range of uses. Gamification commonly employs game design elements to improve user engagement, organizational productivity, learning and knowledge retention, ease of use, and so forth.

The smart contract configuration system works with the intelligence layer, integrated external systems, and other execution platform elements to incorporate intelligent brokering and counterparty discovery to facilitate the contract development process. This capability may also coordinate with services such as marketing and advertising, search functions, blockchain for knowledge, etc. Transactions may be associated with brokering transactions.

Referring to FIG. 219, in embodiments, the distributed ledger 21908 may be any suitable type of electronic ledger 21908, such as a blockchain (e.g., Hyperledger, Solidity, Ethereum, and the like). The distributed ledger 21908 may be centralized, decentralized, or a hybrid configuration where the distributed ledger system 20950 stores a copy of a distributed ledger 21908 in addition to any number of participant nodes 21916 that store copies of the distributed ledger 21908. When referring to the distributed ledger 21908, the term "distributed ledger" (and/or any logs, records, smart contracts, blocks, tokens, and/or data stored thereon) may refer to a specific instance of a copy of the distributed ledger 21908 (and/or any logs, records, smart contracts, blocks, tokens, and/or data stored thereon) and/or the collection of local copies of the distributed ledger 21908-L stored across any number of nodes (which may include the distributed ledger system 20950), unless specifically indicated otherwise.

In some embodiments, a private network of authorized participants, such as one or more of the knowledge providers and/or nodes, may establish cryptography-based consensus on one or more items, such that the distributed ledger system 20950 may provide security, transparency, ability to audit, immutability, and non-repudiation to transactions for digital knowledge. In some embodiments, a trusted authority (e.g., the distributed ledger system 20950 or another suitable authority) may issue private key and public key pairs to each registered user of the distributed ledger system 20950. The private key and public key pairs may be used to encrypt and decrypt data (e.g., messages, files, documents, etc.) and/or to perform operations with respect to the distributed ledger 21908. In some embodiments, the distributed ledger system 20950 (or another trusted authority) may provide two or more levels of access to users. In some embodiments, the distributed ledger system 20950 may define one or more classes of users, where each of the classes of users is granted a respective level of access. In some of these embodiments, the distributed ledger system 20950 may issue one or more access keys to one or more classes of users, where the one or more access keys each correspond to a respective level of access, thereby providing users of different levels of access via their respective issued access keys. In embodiments, possession of certain access keys may be used to determine a level of access to the distributed ledger 21908. For example, in some embodiments, a first class of users may be granted full viewing access of a block, while a second class of users may be granted both viewing access of blocks and an ability to verify and/or certify one or more instances of digital knowledge contained within a block, and while a third class of users may be granted viewing access of blocks, an ability to verify and/or certify one or more instances of digital knowledge contained within a block, and an ability to modify the one or more instances of digital knowledge contained within the block. In some embodiments, a class of users may be verified as being a legitimate user of the distributed ledger 21908 in one or more roles and allowed related permissions with respect to the distributed ledger and content stored therein. A user may be verified, for example, as a bona fide knowledge provider 21906 that uses a knowledge provider device 21990, knowledge recipient 21918 that uses a knowledge recipient device 21994, and/or crowdsource 21936 that uses a crowdsource device 21992. There may be any number of each device 21990, 21992, 21994. As shown in FIG. 219, there is one knowledge provider device 21990, two crowdsource devices 21992, and one knowledge recipient device 21994. In other examples, as it is understood, there may be one, two, three, or more of any device type 21990, 21992, 21994, in any combination. In other examples, there may be one of each device type (e.g., one knowledge provider device 21990, one crowdsource device 21992, and one knowledge recipient device 21994). In other embodiments, these devices 21990, 21992, 21994 may be implemented as one or more computing devices and/or server devices (e.g., as part of a server farm).

In some embodiments, the distributed ledger system 20950 may include a ledger management system 21910. In some embodiments, the ledger management system 21910 manages one or more distributed ledgers (also referred to as "ledgers"). In some embodiments, the ledger management system 21910 may instantiate a distributed ledger for a particular knowledge provider 21906 or group of knowledge providers 21906, such as by instantiating a distributed ledger 21908 that stores instances of digital knowledge 21904 provided by the knowledge provider 21906 or group of knowledge providers 21906. The distributed ledger system 20950 may allow only the particular knowledge provider 21906 or particular group of knowledge providers 21906 to host instances of digital knowledge 21904 (e.g., by using knowledge provider device 21990) on the related distributed ledger 21908 and/or for each instance of digital knowledge 21904, such that each distributed ledger 21908 is specific to a respective knowledge provider 21906 and/or an instance of digital knowledge 21904. In some embodiments, the ledger management system 21910 may instantiate a plurality of distributed ledgers 21908, one or more of the distributed ledgers 21908 being configured to facilitate hosting, sharing, buying, selling, licensing, or otherwise managing a category of digital knowledge 21904. Categories of digital knowledge may be related to, for example, one or more industries such as automotive and/or financial or one or more types of digital knowledge, such as 3D printing schematics. In some embodiments, the ledger management system 21910 may maintain a distributed ledger that facilitates management of some or all of the instances of digital knowledge 21904 and/or the knowledge providers 21906 for which related data is stored by the distributed ledger system 20950.

In some embodiments, a distributed ledger 21908 is any suitable type of blockchain. Any other suitable types of distributed ledgers may be used, however, without departing from the scope of the disclosure. The distributed ledger may be public or private. In embodiments, where the distributed ledger is private, reading from the ledger and/or validation privileges by a user such as the knowledge provider 21906 (e.g., using knowledge provider device 21990) may be restricted to invitees, users with one or more accounts/passwords, or by any other suitable method of restricting access to the distributed ledger 21908. In some embodiments, the distributed ledger 21908 may be at least partially centralized, such that a plurality of nodes of the distributed ledger is stored by the distributed ledger system 20950. In some embodiments, the distributed ledgers are federated distributed ledgers, as the distributed ledgers may be stored on pre-selected or pre-approved nodes that are associated with the parties to a management of digital knowledge 21904 via the distributed ledger system 20950. The techniques described herein may be applied, however, to publicly distributed ledgers as well. In a publicly distributed ledger, any suitably configured computing device (personal computers, user devices, servers) or set of devices (e.g., a server farm) may act as a node 21916 and may store a local copy of a distributed ledger 21908-L, whether the owner of the node otherwise participates in the transactions facilitated by the distributed ledger system 20950. In these embodiments, such nodes 21916 may add, validate, or deny new blocks, save new blocks to the distributed ledger 21908 (if validated) to maintain a full copy (or nearly full copy) of the transaction history relating to the distributed ledger 21908, and broadcast the transaction history to other participating nodes 21916.

In some embodiments, the ledger management system 21910 (and/or the collection of participant nodes 21916) may be configured to leverage a distributed ledger 21908 to create an immutable log establishing of a chain of work, possession, and/or title of one or more instances of digital knowledge 21904, establishing verification of one or more sources of the digital knowledge 21904, and/or facilitating collaboration of a plurality of knowledge providers 21906. In some embodiments, the ledger management system 21910 may utilize a distributed ledger to manage a set of permission keys that provide access to one or more instances of the digital knowledge 21904 and/or services associated with the distributed ledger system 20950. In some embodiments, the distributed ledger 21908 provides provable access to the digital knowledge 21904, such as by one or more cryptographic proofs and/or techniques. In some embodiments, the distributed ledger 21908 may provide provable access to the digital knowledge 21904 by one or more zero-knowledge proof techniques. In some embodiments, the ledger management system 21910 may manage the distributed ledger to facilitate cooperation and/or collaboration between two or more knowledge providers 21906 with regard to one or more instances of digital knowledge 21904.

FIG. 220 illustrates an exemplary embodiment of the distributed ledger 21908, the distributed ledger 21908 being distributed over a ledger network 21070. The ledger network 21070 may include the distributed ledger 21908 and a set of node computing devices 21916 that communicate via one or more communication networks 21070. In some embodiments, the communication network 21070 may include the Internet, private networks, cellular networks, and/or the like. In embodiments, the nodes 21916 may all host a copy of the distributed ledger 21908 (or a portion thereof). For example, the ledger network 21070 may include a first node 21916-1, a second node 21916-2, a third node 21916-3 . . . and an Nth node 21916-N that communicate with the distributed ledger system 20950 and with other nodes 21916 in the ledger network 21070. In some embodiments, the distributed ledger system 20950 is configured to execute the ledger management system 21910 and may store and manage a local copy of a distributed ledger 21908 that is used in connection with facilitating management of one or more instances of the digital knowledge 21904 via the distributed ledger system 20950. In some embodiments, the distributed ledger system 20950 (or the ledger management system 21910 executed thereon) may also be thought of and referred to as a node of the ledger network 21070. In some embodiments, the ledger management system 21910 may also generate and assign private key and public key pairs to users such as one or more of the knowledge providers 21906 and/or one or more receivers 21918 of the digital knowledge 21904 (also referred to as "knowledge recipients") and/or to each node 21916 in the ledger network 21070, such that the private key and public key pairs are used to encrypt data transmitted between nodes 21916 in the ledger network 21070.

In some embodiments, each of the nodes 21916 of the ledger network 21070 (other than the distributed ledger system 20950) may be a computing device or a set of connected computing devices that are associated with the knowledge providers 21906 and/or knowledge recipients 21918. In some embodiments, the nodes 21916 may include computing devices of parties that are not involved in the providing or receipt of knowledge (e.g., parties that are associated with neither the knowledge providers 21906 nor any of the knowledge recipients 21936). In some embodiments, each of the nodes 21916 may store a respective local copy 21908-L of the distributed ledger 21908. In some embodiments, one or more nodes may store a partial copy of the distributed ledger 21908. In some embodiments, each of the nodes 21916 may execute a respective agent 22020. An agent 22020 may be configured to perform one or more of managing the local copy 21908-L of the distributed ledger 21908 associated with the node 21916 that executed the agent 22020, helping verify blocks that were previously stored on the distributed ledger 21908, helping verify requests from other nodes 21916 to store new blocks on the distributed ledger 21908, requesting permission to perform operations relating to the digital knowledge or management thereof on behalf of a user associated with the node 21916 on which the agent resides, and/or facilitating collaboration between one or more of the knowledge providers 21906 and/or one or more of the knowledge recipients 21918 (e.g., using knowledge provider device(s) 21990 and/or knowledge recipient device(s) 21994, respectively), such as by assisting with validation and/or transfer of one or more instances of the digital knowledge 21904 and/or executing one or more clauses of one or more smart contracts 21940. It is understood that nodes may perform additional or alternative tasks without departing from the scope of the disclosure.

In some embodiments, the distributed ledger system 20950 may include a smart contract system 21968 configured to generate smart contracts 21940 and deploy the smart contracts 21940 to the distributed ledger 21908. In embodiments, a smart contract 21940 may refer to a piece of software stored on the distributed ledger 21908 and configured to manage one or more rights associated with one or more instances of the digital knowledge 21904 and/or one or more knowledge tokens 22038. In embodiments, the smart contract may be a computer protocol that assists with negotiation and/or performance of terms in an agreement (e.g., distributed on blockchain such as Ethereum blockchain). The smart contract may be used in banking, government, management, supply chain, automobiles, real estate, health care, insurance, etc. In some embodiments, the smart contract 21940 may be contained and/or executed in a virtual machine or a container (e.g., a Docker container). In some embodiments, one or more of the nodes 21916 of the ledger network 21070 may provide an execution environment for the smart contract 21940. In embodiments, a smart contract 21940 may include information, data, and/or logic related to an instance of digital knowledge 21904, one or more triggering events, one or more smart contract actions to be executed in response to detection of one or more of the triggering events, and the like. In embodiments, the triggering events may define conditions that may be satisfied by events performable by one or more users, such as the knowledge provider 21906, the knowledge recipient 21918, and/or the crowdsource 21936, or by one or more third parties. Examples of the triggering events include payment of one party by another party, adherence or lack of adherence to one or more terms of a sales, licensing, insurance, or other agreement made by one or more parties, meeting of one or more thresholds or ranges of properties of one or more pieces of the digital knowledge 21904, such as value, user rating, production amount, or any other suitable property, passage of time, or any other suitable triggering event. Additionally or alternatively, the triggering events defined in a smart contract 21940 may include conditions that may be satisfied independently of an action or inaction of a human. For example, a triggering event may be when a certain date is reached, when a stock price reaches a certain threshold, when patent rights expire, when a copyright expires, when a natural event occurs (e.g., a hurricane, a tornado, a drought, or the like), etc. Triggering events may be defined as different types of triggers. For example, triggers or triggering events may refer to changing states (e.g., state change event) such as where the smart contract is active upon a set of data states (e.g., state change events). In other examples, triggers or triggering events may refer to events that occur such that users may need to passively wait for the events to occur and the distributed ledger system 20950 may need to monitor for these events.

In embodiments, smart contract actions 22086 may include, for example, monitoring events from a defined data source, verifying fulfillment of obligations of one or more users and/or third parties according to one or more conditions 22084 defined in the smart contract 21940, verifying payment and/or transfer of tokens, property, other goods, or services, between one or more users and/or third parties, transferring the digital knowledge 21904 between parties or to one or more users, logging one or more transactions in the distributed ledger 21908, performing one or more operations with respect to the distributed ledger 21908, creating one or more new blocks 22022 in the distributed ledger 21908, and the like. In some embodiments, a smart contract 21940 may include an event listener 22080 that is configured to monitor one or more data sources (e.g., databases, data feeds, data lakes, public data sources, or the like) for detecting events to determine whether one or more conditions 22084 are met. For example, an event listener 22080 may listen to an application programming interface (API) that provides a connection between the distributed ledger system 20950 and a printer, such that a smart contract may trigger an obligation of a user to make a payment when a printing instruction set governed by the knowledge distribution set (such as a tokenized instruction set in a knowledge token 22038) is used to print an item using the instruction set. Thus, when a predefined set of conditions 22084 is met, then a smart contract action 22086 may be triggered. This may include triggering a payment process (such as initiating an authorization of a payment on a credit card), closing out a contract (such as when a prepaid number of uses of a knowledge set has been reached), determining a price (such as by initiating a reference to current pricing data in a marketplace or exchange), reporting on an outcome (such as reporting a workflow or event), or the like. In response to being triggered, the smart contract may automatically execute the smart contract action 22086. In some embodiments, the smart contracts are Ethereum smart contracts and may be defined in accordance with the Ethereum specification, which may be accessed at https://github.com/ethereum, the contents of which are incorporated by reference. In other embodiments, the smart contract system 21968 may include the event listener 22080.

In some embodiments, the ledger management system 21910 may define one or more operations that may handle or process commitments of one or more parties to the smart contract 21940 and/or terms thereof. When a set of parties (e.g., knowledge providers 21906, knowledge recipients 21918, crowdsources 21936 and/or third parties) commit to the terms of a smart contract 21940 to a term of a smart contract governing the transfer of digital knowledge 21904, the distributed ledger system 20950 (and/or the smart contract 21940 itself) may handle or process commitments of the parties and/or identifiers of the parties to one or more portions (e.g., terms) of the smart contracts 21940. In embodiments, upon a set of parties committing to a smart contract 21940, the smart contract 21940 and/or the distributed ledger system 20950 may link one or more of the parties to one or more of the triggering events defined in the smart contract 21940, begin monitoring one or more data sources to determine whether any conditions 22084 defined as trigger events are met, and/or automatically perform operations/actions defined in the smart contract (e.g., in response to the occurrence of a triggering event). For example, a knowledge provider 21906 may upload a smart contract 21940 (e.g., using knowledge provider device 21990) to the distributed ledger 21908 and/or customize a smart contract 21940 using a smart contract template in connection with uploading an instance of the digital knowledge 21904. In embodiments, the knowledge provider 21906, a knowledge recipient 21918, or some other party may indicate (e.g., via the distributed ledger system 20950, the distributed ledger 21908, and/or the smart contract 21940) terms of an agreement between the knowledge provider 21906 and the knowledge recipient 21918 upon an agreement being formed between the knowledge provider 21906 and the knowledge recipient 21918. In some embodiments, the smart contract 21940 may include one or more rights, terms, and/or obligations provided by the knowledge provider 21906 and/or a third party prior to identification of and/or dealing with the knowledge recipient 21918. The knowledge recipient 21918 may agree to be bound by rights, terms, and/or obligations defined via the smart contract 21940 upon agreeing to receive the digital knowledge 21904 (e.g., using knowledge recipient device 21994). The knowledge recipient 21918 may be a user who is willing to transact (e.g., buy, license, or otherwise make a deal with the knowledge provider 21906) for the digital knowledge 21904. The smart contract 21940 may commit or otherwise bind (or process commitments) the knowledge provider 21906, the knowledge recipient 21918, and/or other parties to the agreement to terms and/or conditions 22084 of the smart contract 21940 in response to receiving indication via the distributed ledger system 20950 and/or the distributed ledger 21908.

In some embodiments, the distributed ledger system 20950 may include an account management system. In embodiments, the account management system 21946 may facilitate creation and/or storage of user accounts related to users of the distributed ledger system 20950, the distributed ledger system 20950, and/or the distributed ledger 21908. For example, the account management system 21946 may be configured to facilitate registration of one or more of the knowledge providers 21906, the knowledge recipients 21918, the crowdsources 21936, and/or other third parties that may be associated with the distributed ledger system 20950, the distributed ledger system 20950, and/or the distributed ledger 21908. In some embodiments, the account management system 21946 may be configured to, together with the ledger management system 21910, facilitate intake of data from registered users of the distributed ledger 21908, such as name, address, company affiliation, financial account information (e.g., bank account numbers and/or routing numbers), digital identifiers (e.g., IP addresses, MAC addresses, and the like), and any other suitable information related to the registered users.

The account management system 21946 may update the user account of the registered user with data taken in and related to the registered user. In some embodiments, the account management system may facilitate generation and/or distribution of one or more of the permission keys 22032 to one or more of the registered users. The permission keys 22032 may provide the registered user with access to one or more instances of the digital knowledge 21904 and/or services associated with the distributed ledger system 20950.

In some embodiments, the distributed ledger system 20950 may include a user interface system 21950 configured to present a user interface. The user interface may be configured to facilitate uploading of digital knowledge 21904, generation and/or uploading of a smart contract 21940, and viewing of the digital knowledge 21904 and/or the smart contract 21940 (and statuses thereof). The user interface may be a graphical user interface. Information presented to users of the distributed ledger system 20950 via the user interface may include descriptions of one or more instances of the digital knowledge 21904, ownership and/or licensing information related to the one or more instances of the digital knowledge 21904, information related to the user viewing the user interface and/or other users of the distributed ledger system 20950, price information related to one or more instances of the digital knowledge 21904, statistics and/or metrics related to the distributed ledger 21908 and/or contents thereof, such as node count, payouts for generation of additional nodes, and any other suitable information. In some embodiments, users may view contents of their digital wallets via the user interface, such as a balance of one or more types of currency tokens.

In some embodiments, the user interface may be configured to allow one or more users to perform one or more of the operations related to the digital knowledge 21904 and/or the distributed ledger 21908, such as buying, selling, verifying, and/or reviewing the digital knowledge 21904 and/or performing other operations related to the distributed ledger 21908 discussed herein. For example, the knowledge provider 21906 may select a computer file (such as a 3D printer schematic file) to upload to the distributed ledger 21908 via the user interface (e.g., using knowledge provider device 21990). The user interface may present the knowledge provider 21906 with one or more options related to uploading the digital knowledge 21904, such as an ability to configure a smart contract 21940 and related terms for wrapping and/or tokenizing the digital knowledge 21904. Other options may include privacy options, such as options pertaining to one or more users or classes of users who may and/or may not view, buy, sell, license, rate, verify, review, or otherwise manage or interact with the digital knowledge 21904.

In embodiments, the distributed ledger system 20950 may include one or more datastores 21958. In some embodiments, the distributed ledger system 20950 may include one or more datastores 21958 configured to store data related to the digital knowledge 21904, the distributed ledger 21908, the knowledge providers 21906, the knowledge recipients 21918, the crowdsources 21936, the knowledge tokens 22038, the smart contracts 21940, the account management system 21946, the marketplace system 21954, or any other suitable type of data. A datastore may store folders, files, documents, databases, data lakes, structured data, unstructured data, or any other suitable data.

In some embodiments, the datastores 21958 may include a knowledge datastore 22060 configured to store data. The knowledge datastore 22060 may be in communication with the user interface system 21950. The user interface system 21950 may be configured to populate the user interface with data stored in the knowledge datastore 22060. In some embodiments, data stored in the knowledge datastore 22060 may include knowledge related to the digital knowledge 21904 such as source, reviews, price, ownership, licensing, related knowledge providers 21906, related knowledge recipients 21918, serial numbers, related crowdsources 21936, or any other suitable information. For example, the knowledge datastore 22060 may contain information related to a 3D printer schematic such as origin, date of creation, names of one or more contributing individuals, groups, and/or companies, pricing, market trends for related schematics, serial numbers and/or part identifiers, and any other suitable type of data related to the 3D printer schematic.

In some embodiments, the datastores 21958 may include a client datastore 22062 (e.g., may include user datastore), the client datastore 22062 being configured to store data relating to users of the distributed ledger system 20950. The client datastore 22062 may be in communication with the account management system 21946 and may be populated with user accounts related to one or more of the user accounts, data contained in one or more of the user accounts, data related to the one or more user accounts, and/or a combination thereof.

In some embodiments, the datastores 21958 may include a smart contract datastore 22064. In embodiments, the smart contract datastore 22064 is configured to store data related to one or more of the smart contracts 21940 and/or smart contract templates (from which smart contracts 21940 may be parameterized and instantiated). In embodiments, the smart contract datastore 22064 may be in communication with the ledger management system 21910. Data stored in the smart contract datastore may include, for example, smart contract templates, one or more smart contracts 21940, data related to instances of the digital knowledge 21904 related to one or more of the smart contracts 21940, data related to parties to one or more of the smart contracts 21940, and any other suitable data. The smart contract datastore 22064 may be configured to store completed smart contracts that have already been executed. The smart contract datastore 22064 may be configured to store smart contracts that have not yet been uploaded to the distributed ledger 21908.

FIG. 221 illustrates a method 22100 of performing high level process flow of a smart contract that distributes digital knowledge. In embodiments, the smart contract may be a knowledge token that is stored on the distributed ledger and that is executed by one or more nodes that host the distributed ledger. In some of these embodiments, the smart contract may be executed on a virtual machine or in a container.

At 22110, the smart contract monitors one or more of the conditions defined in the smart contract. In some embodiments, an event listener obtains data (either passively or actively) from one or more data sources defined in the smart contract 21940. As the event listener obtains data from the one or more data sources, the smart contract may determine whether certain conditions are met, and if so, may perform an action that is triggered by the met conditions.

At 22112, the smart contract verifies conditions for execution of one or more terms of the smart contract, and at 22114, the smart contract initiates execution of the one or more terms of the smart contract. In embodiments, the smart contract may include an event listener that determines whether a requisite amount of funds have been deposited to the smart contract. Once a party has deposited the requisite amount of funds (e.g., a predefined amount of cryptocurrency or fiat currency), the smart contract may initiate the transfer of the digital knowledge to the knowledge recipient (e.g., the party that deposited the requisite amount of funds). In embodiments, this may include updating the distributed ledger with a block that indicates the change in ownership of the token to the knowledge recipient and providing any required keys to the knowledge recipient. Once the ownership of the knowledge token has been changed, the knowledge recipient may access the digital knowledge contained therein (and in accordance with any restrictions defined in the smart contract, such as using a particular type of device).

Referring to FIG. 217, in embodiments, the analytics system 20940 (with optional reporting capabilities) may be configured into and/or in association with a gaming engine and smart contracts execution platform 20900. The analytics system 20940 may provide a range of analysis services to other components of the platform, such as analysis of data provided to an intelligence layer 21100 for use in artificial intelligence and the like. An intelligence layer 21100 may utilize an analysis system 20940 to provide comparative analysis of a range of intelligence functions, outcome ranking approaches, and the like. The intelligence layer 21100 may further engage analytics and reporting system capabilities for analysis support of intelligence layer analysis modules 21112. The analytics and reporting system 20940 may facilitate analysis for a risk analysis intelligence analysis module 21702. Other intelligence analysis modules 21112 that may leverage at least the analytics capabilities of the analytics and reporting system include modules for security analysis 21712 (e.g., analyze security measures and remediation actions), ethics analysis 21716 (e.g., a structured analytical approach to ensure compliance with ethics factors), hazard analysis 21720, quality analysis 21724, safety analysis 21722, FMEA analysis 21718 (e.g., apply failure mode analysis algorithms), decision tree analysis 21714 (e.g., provide analysis of multiple decision options), risk analysis 21710 (e.g., perform analysis of various scenarios for risk implications), and the like. In embodiments, an analysis module management 21116 module may provide a set of interfaces, such as APIs and the like, through which the analytics and reporting system 20940 may communicate (e.g., provide analytics services) with one or more intelligence analysis modules 21112.

In embodiments, the analytics system 20940 may further perform analysis functions for or as a part of a data processing system 20930 of the platform. In an example, data analysis algorithms (optionally embodied as software functions and the like) may be used by a data processing system 20930 to perform analysis of data being processed by the data processing system 20940. The data processing system 20930 may utilize the analytics system 20940 to handle various statistical analysis functions and the like. A reporting system (optionally a portion of an analytics and reporting system 20940 of the gaming engine and smart contracts execution platform 20900) may use capabilities of an analysis system to determine one or more optimal reporting schedules and the like. In an example, an analysis system 20940 may facilitate analyzing a degree to which information to be reported changes over time, thereby enabling a reporting system to direct computing resources of the data processing system 20930 to process data in reporting areas in which information is more regularly changing, such as by reducing reporting frequency of infrequently changed information.

In embodiments, an analytics system may facilitate automated adaptation of an interface system 20980 of the platform, such as by analyzing efficiency of users accomplishing one or more outcomes within a user interface portion of an interface system of the platform 20900. Similarly, for a computer-to-computer interface portion of the interface system 20980, the analytics system 20940 may facilitate determining, for example, an optimal range of a count of active input/output ports to achieve an interface goal, such as ensuring a level of service for response time to external computer system requests for access to the platform. In embodiments, an analytics system of the platform may play a role in ensuring platform security in cooperation with a platform security system 20960, such as by updating security statistics of the platform (e.g., rates of attempted security breaches, ranking of malware remediation approaches, and the like).

Referring to FIG. 218, in embodiments, an analytics and reporting system 20940 may provide analytics and/or reporting services to a distributed ledger system 20950 of the platform 20900. A distributed ledger system 20950 of the platform may utilize reporting services to generate reports of transactions, transaction outcomes, and the like for use by, for example, a blockchain smart contract data management service 20952 and the like. Other exemplary uses of an analytics and reporting system 20940 by a distributed ledger system 20950 include providing analysis of blockchain smart contract transaction services 20951, such as escrow services to ensure, among other things, that transaction scenarios that may impact escrow management are thoroughly vetted. In further exemplary embodiments, transaction outcome analysis, such as for determining carbon offset credits required for carbon-neutral transaction services may be provided by or in association with the analytics and reporting system 20940. The analytics and reporting system 20940 may also provide monitoring services to a distributed ledger system 20950, such as to monitor activity levels (e.g., via network data analysis) of nodes of a distributed ledger architecture and the like.

An analytics and reporting system 20940 of the platform may perform analysis of external sensor data that is accessed by the platform through an external data and services platform capability 21060 to verify, for example, smart contract execution. In an example, external sensor data may record production information for a production line that is called out in a smart contract as determining a daily allocation of financial accruals per contract terms. The analysis and reporting system may perform analysis of the production line sensor data against contract terms, such as minimum quantities, yield, bonus quantities and the like for a plurality of production lines and report a result of analysis into an accrual data set. The reported data from the analysis may include production line-specific accruals, deficits, and the like on a timed basis, such as hourly, daily, per production shift, and the like.

Computing capabilities of an analytics and reporting system 20940 of the platform may include platform-accessible web servers, data processing systems, and quantum computing services, such as cloud-based quantum computing services and the like. In embodiments, the analytics system 20940 may use conventional computing capabilities where doing so provides an acceptable level of performance, accuracy, and/or reliability of analysis. The analytics system 20940 may also or instead rely on quantum computing services when a desired level of accuracy, reliability, or the like is not being achieved through the use of conventional computing services.

In embodiments, an analytics capability of a platform for integrating gaming engine capabilities with smart contract capabilities 20900, such as in a common execution framework, may facilitate providing analysis for smart contract services, such as for any of development, management, and execution of smart contracts. The analytics and reporting system 20940 of the platform may facilitate providing analysis services to one or more components and/or services of a smart contracts system 21040 portion of the platform. The smart contracts system 21040 may provide a smart contracts configuration service to facilitate access to, for example, smart contracts in a contracts library 21042 and the like. Configuring smart contracts, such as through a smart contracts configuration service 21044, may also include smart contracts analysis. In embodiments, smart contracts analysis may facilitate determining, such as in response to a request for smart contracts configuration, a suitability of a smart contract, such as a contract from the smart contracts library, to satisfy one or more configuration parameters. In an example, a smart contracts configuration service 21044 may be accessed to configure one or more smart contracts for operating an insurance provisioning service in a target jurisdiction, such as a state in the United States or a county in such a state, or even a city or local town in such a state. The analysis and reporting system 20940 of the platform may be engaged to analyze a plurality of smart insurance contracts, such as in a smart contracts library 21042 for, among other things, compliance with insurance industry regulations in the target jurisdiction. In another example, a smart contracts configuration service request may include provisioning insurance contracts that meet a minimum quality rating, such as based on a national insurance provider rating service, a local business bureau rating service, and the like. The analysis and reporting system 20940 could be engaged in this example to analyze and report on the pertinent quality rating of jurisdiction-specific smart insurance contracts (e.g., contract terms and the like) in, for example, the smart contracts library 21042. In yet another example, the analysis and reporting module 20940 may be engaged to perform performance analysis of various smart contracts, such as based on uses of the contracts for historical smart contracts configuration service requests. In this example, a base auctions smart contract performance may be analyzed in comparison to a customized (e.g., third-party contributed, machine-learning enhanced, artificial intelligence-based) auctions smart contract performance to, among other things, determine if the base contract provides an acceptable level of performance to satisfy a corresponding requirement in a request for smart contracts configuration that is being serviced by the smart contracts configuration service 21044 of the smart contracts system 21040. In summary, an analytics and reporting system 20940 may work cooperatively with a smart contract system 21040 for a range of analysis services including, without limitation: analyze contract terms for suitability; provide monitoring and notification services for contract compliance during operation; analyze deliverables for verification of contracted terms; provide analysis of custom contracts against a set of contract performance parameters; provide monitoring and reporting services for discovery of new and changes to existing external/public/customized contract segments.

In embodiments, the analytics and reporting system 20940 may work in cooperation with a plurality of platform modules, such as the gaming engine system 20902 and the intelligence layer 21100 to, for example, identify and report fraudulent and/or anomalous activity during smart contract development and/or execution. As an example, the analytics and reporting system 20940 may perform a trend analysis of a smart contract instance. The analytics and reporting system 20940 may compare results of any portion (including temporally incomplete portions) of that trend analysis with a corresponding reference trend, such as a generalized set of historical data associated with earlier instances of the same or similar smart contracts to detect, flag, and optionally report anomalies and potentially problematic trends.

In embodiments, an analytics and reporting system 20940 of the platform may facilitate providing analysis services to one or more components and/or services of a gaming engine system 20902 portion of the platform. The gaming engine system 20902 may provide a gaming engine configuration service 21030 to facilitate access to, for example, gaming engine modules in a module library 21032 and the like. Configuring gaming engines, such as through a gaming engine configuration service 21030, may also include gaming engine module analysis 21034. In embodiments, gaming engine module analysis 21034 may facilitate determining, such as in response to a request for gaming engine configuration, a suitability of a module, such as a module from the gaming engine module library 21032, to satisfy one or more configuration parameters. In an example, a gaming engine configuration service may be accessed to configure one or more gaming engines for operating an insurance provisioning service in a target jurisdiction, such as a state in the United States or a county in such a state, or even a city or local town in such a state. The analysis and reporting system 20940 of the platform may be engaged to analyze a plurality of gaming engine insurance modules in a gaming engine module library 21032 for, among other things, compliance with insurance industry regulations in the target jurisdiction. In another example, a gaming engine configuration service request may include provisioning insurance services that meet a minimum quality rating, such as based on a national insurance provider rating service, a local business bureau rating service, and the like. The analysis and reporting system 20940 could be engaged in this example to analyze and report on the pertinent quality rating of jurisdiction-specific insurance modules in the gaming engine module library 21032. In yet another example, the analysis and reporting system 20940 may be engaged to perform performance analysis of various gaming engine modules, such as based on uses of the modules for historical gaming engine configuration service requests. In this example, a base auctions gaming engine module performance may be analyzed in comparison to a customized (e.g., third-party contributed, machine-learning enhanced, artificial intelligence-based) auctions gaming engine module performance to, among other things, determine if the base model provides an acceptable level of performance to satisfy a corresponding requirement in a request for gaming engine configuration that is being serviced by the gaming engine configuration service 21030 of the gaming engine system 20902.

In embodiments, the analytics and reporting 20940 system may provide analysis and may optionally provide reporting services for various gaming engine analysis operations, such as simulation of gaming engine smart contract options. Through use of analysis of simulation outcomes for a range of criteria, such as performance, governance compliance, reliability, ease of use, cost to implement, and the like, gaming engine smart contract options may be analyzed and compared. Further by application of simulation outcome analysis, the analytics and reporting system may support autonomous and/or semi-autonomous smart contract term selection. The analytics and reporting system 20940 may coordinate simulation outcome analysis with artificial intelligence services 21120 of the intelligence layer 21100 to train the simulation system for improving simulation confidence and compliance with, for example, real-world smart contract and gaming engine operations. In some embodiments, ML/AI supports automation, detection, decision support, and/or categorization/clustering.

In embodiments, the intelligence layer works with the gaming engine system and other platform elements and sub-elements and a range of external data and services to facilitate operations in association with the development and execution of gaming engine smart contracts. Artificial intelligence services include capabilities such as machine learning, rules-based systems, RPA, digital twins, machine vision, NLP, neural networks, etc. These services can be combined in any way to facilitate all types of analyses, decisions, recommendations, etc. associated with all aspects of development and execution of gaming engine smart contracts.

Areas for AI automation are broad. A partial list includes: automated smart contract code development, contract parsing, contract element selection and assembly to produce a complete contract, contract execution feedback and learning, selection of gaming engine tools for contract verification, etc. Working with the data processing system and the smart contract system, the intelligence layer can be configured to automatically monitor smart contract execution and provide alerts and notifications associated with contract terms, governance, fraud, etc.

The intelligence layer provides a range of AI and governance capabilities and libraries that work with the smart contract system and external data and services to provide governance and compliance analysis support. Examples include determination of fairness, regulatory conformance, determination of whether contract terms were met, etc.

Working with the data processing system, the intelligence layer provides a range of AI capabilities to help with mechanisms related to categorizing and grouping smart contract transactions, contract types, clients associated with certain contracts, and so forth. Possible applications include maintaining, updating, and organizing libraries based on contract outcomes, using similar transaction data to parse contract requests into an executable contract, etc. (see also smart contract libraries).

The intelligence layer provides a digital twin capability that works with the smart contract system. Digital twin services can be provided to Platform users through the interface system as a digital twin user interface, for example a GUI, to help visualize contract execution based on a range of data inputs such as weather, users, economic conditions, etc. More generally, a digital twin library can be developed and maintained for smart contract elements and assemblies for use with a range of analyses.

The intelligence layer provides digital twins that can be bi-directionally embedded or associated with various smart contract elements through an API or other means so that the digital twins can incorporate live marketplaces based on smart contracts for various services such as insurance, leasing, etc. In-twin marketplaces can provide richer tools for making contract decisions and adjustments based on real-time data. This capability may also introduce the possibility for the execution of phased contracts based on combined simulations and actual execution.

In embodiments, the analytics and reporting system 20940 may engage with digital twin capabilities for performing simulation. In an example, digital twin-specific analytics capabilities may be provided for the use of digital twins in performing gaming engine smart contract simulations. Such analytics capabilities may be provided as an on-demand service by the analytics and reporting system 20940 responsive to a request for analytics capabilities by a digital twin associated with gaming engine smart contract simulation. In an example of automated smart contract term selection, a client may request a contract for a house painting service. In response, the platform may perform simulations of house painting service smart contracts based on, among other things, data associated with such a request (e.g., a jurisdiction, a contact volume, a target cost and risk of ensuring contract compliance and execution, and the like). Through application of the analytics and reporting system 20940 to analyze one or more outcomes of the simulations of house painting service smart contract options available in, for example, a library of smart contracts 21042 and to report a result of the analysis of these options, the platform may provide a ranked selection of contract proposals, including complete contracts to the client.

In general, the analytics and reporting system 20940 may be engaged to perform analysis of a wide range of platform operations, from determining alignment between business plans and business outcomes, demand for computing services, evaluating a range of client businesses engaging the platform, compliance with local regulations across a range of deployment jurisdictions, measures and metrics of new client engagement timing (e.g., time from initial engagement to some form of service provisioning), and the like. This analysis of platform operations may be performed on an as needed basis (e.g., based on a third party smart contract or other provider requests for co-marketing the third-party services through the platform), on a periodic basis (e.g., each month, quarter, or the like), on a platform development schedule (e.g., ahead of a planned expansion or new release of a portion of the platform), based on a financial planning schedule (e.g., when developing budget requirements for an upcoming term, such as a new fiscal year), and the like.

In embodiments, an analytics and reporting system 20940 of the platform may provide analysis services, functions, algorithms, and the like that supports opportunity mining and/or discovery of gaming engine smart contract capabilities, services, and functions. In an example, the analytics and reporting system 20940 may work with, for example, the smart contract system 21040 and optionally with one or more intelligence layer services 21100 to proactively identify and develop smart contract configurations based on analysis of platform activity and information accessible to and optionally produced by the platform. One such analysis may include using the analytics and reporting system 20940 to identify use trends to facilitate prediction of smart contract configurations, services, terms, and the like.

In embodiments, analytics and reporting in a platform for integrating a set of gaming engines and a set of smart contract services in a common execution framework may be provided by an analytics and reporting system 20940, such as the one described herein. An analytics and reporting system 20940 may facilitate analysis and reporting on, among other things, various aspects of platform operation such as system status, system statistics, operational capabilities along with other platform functions, such as key performance metrics, error conditions, risk conditions, and so forth. Output, such as those mentioned above and others, of this system may be provided to the interface system for display on a platform administrator dashboard (e.g., GUI). In another example, output of the analytic and reporting system 20940 may be used by the intelligence layer 21100 to help train machine learning algorithms for, among other things, optimizing outcomes for various aspects of the platform, including smart contract configuration, gaming engine recommendations, and integration of gaming engine features with smart contract services.

The analytics and reporting system 20940 may be embodied as one or more standalone computing systems in communicating relationships with other components of the platform 20900. Such a standalone computing system may be configured with local data storage that may provide access to analytic algorithms, historical analysis data, and the like. In embodiments, access to such algorithms, historical data, and the like may be provided by one or more other portions of the platform, such as through networked connection to data storage facilities, via API calls, and the like.

In embodiments, the analytics and reporting system 20940 may be configured as a set of software programs that may be accessible in computer storage facilities of the platform and may be accessible to processors and other computing facilities of the platform. In embodiments, software program embodiments of the analytics and reporting system 20940 may be accessible as one or more sets of third-party services to which the platform may acquire access, such as through a subscription for analytic services, reporting services, and the like.

In embodiments, an analytics and reporting system 20940 of the platform may provide ancillary services that may leverage one or more of analytics capabilities and reporting capabilities to enhance service provisioning of the platform. Such enhanced service provisioning may include, among other things, further automating of analytic functions thereby extending a range of service offerings (e.g., smart contract options) in association with third parties. Example ancillary services of an analytics and reporting system 20940 may include database searching 20941, monitoring and notification 20942, marketing, advertising, research 20943, data stories support, and the like. In a simple example application of a marketing and/or advertising ancillary service, third party smart contract authors, providers, facilitators, and the like may gain access to platform client requests for gaming engine enhanced smart contracts. The analytics and reporting system 20940 may provide contextual information based on analysis of, for example, platform client requests, that may be used by a marketing and/or advertising ancillary service to determine sample criteria for accepting smart contract proposals from third parties. This analysis may include, for example, the types of smart contracts being requested by clients, the types of terms of smart contracts most likely to be selected by clients, the nature of business situations to which clients request application of smart contracts, and the like. Through this analysis, it may, for example, be reported by the analytics and reporting system 20940 that third party smart contract providers who offer contract term execution monitoring capabilities are preferred over smart contract offerings that require a client to engage with additional vendors for such services.

Marketing, advertising, search, and transaction systems are provided in some embodiments.

In embodiments, the analytics and reporting system 20940 incorporates one or more of the ancillary services including any of marketing, advertising, and research 20943 that enables the platform to perform targeted analysis, such as analysis of contract execution data, targeted advertising based on proposed or requested client services, active marketing to platform users, and so forth. This type of activity may inherently establish a market that can use the intelligence layer 21100 and gaming engine system 20902 to perform targeted research.

In embodiments, an analytics and reporting system 20940 may facilitate offering and/or access by platform clients to data stories capabilities. Data stories describe, illustrate, or otherwise provide detailed understanding regarding an area of interest, where available data is analyzed and presented for a specific audience or client. For example, a financial analysis, optionally performed by the analytics and reporting system 20940, for evaluating different risk scenarios for gaming engine integration with business applications might employ a gaming engine for both simulation and visualization for a chief financial officer (CFO) or other senior officers of a client business entity and the like. In this context, data stories may be provided as a service within the smart contract system that may be supported by the analysis and reporting system 20940. In embodiments, data stories may be included as an ancillary service of the data analytics and reporting system 20940.

As noted above, the analytics and reporting system 20940 may provide ancillary services. An ancillary service of the analytics and reporting system may include working with one or more of the intelligence layer 21100, the data processing system 20930, and the user interface system 20980, to provide various search capabilities for internal and external clients. In examples, one or more processors of the analytics and reporting system 20940 (or executing routines of the analytics and reporting system) may provide database search capabilities 20941. Database search capabilities may include search query generation assistance, such as deriving search queries based on, for example, analysis of parameters associated with a search request. Parameters associated with a search request may include search terms, search targets (e.g., private search databases, public/Internet databases, and the like), and the like. However, parameters associated with a search request may include other aspects, such as a target or maximum cost of the search, search terms constraints (e.g., no plurals, literal word/term occurrence, and the like), a frequency of searching (e.g., for ongoing searches, such as to populate terms of a smart contract and the like), turnaround time for a response that exhibits a confidence level above a search confidence threshold (e.g., to achieve a set of targeted results), and the like. These and other search request parameters may be explicit (e.g., specified by the request) and/or implicit (e.g., based on prior search requests, keywords, search targets, and the like).

In embodiments, a searching ancillary service may leverage capabilities of other portions of the platform, such as the intelligence layer 21100 for accessing intelligence services (e.g., artificial intelligence 21120) to enrich search query generation, analysis of results, and the like.

The analytics and reporting system 20940 may further offer monitoring and notification 20942 ancillary services. These ancillary services may, in example embodiments, be combined with one or more core functions of the platform to, for example, improve performance thereof. In an example, a monitoring ancillary service 20942 may monitor for a critical change in statistics associated with operations of the platform, such as a decrease greater than 10% across units of time (e.g., month-over-month, week-over-week, and the like) in requests for gaming engine and/or smart contract integration services. When critical changes are detected, a notification function may provide notification to a platform owner, operator, and the like to facilitate taking remedial action, such as attempting to mitigate an impact of the decrease in requests on profitability of the platform. In embodiments, a notification ancillary service 20942 may attempt to notify platform users, such as select clients of the platform, when services requested of the platform, such as optimizing outcomes for a set of candidate gaming engine smart contract configurations are completed or nearly so. Similarly, the notification ancillary service 20942 may work in cooperation with the reporting services to deliver to targeted clients and/or platform administrators results of operational analysis, such as a completion of a service request, a delay in completion of the service request, and the like. In addition to monitoring platform operations, statistics, metrics, and the like (at least a portion of which may be generated by the analytics capabilities of the analytics and reporting system 20940), a monitoring ancillary service 20942 of the analytics and reporting system may facilitate monitoring smart contract terms and/or variables during, for example, operation of a smart contract portion of a gaming engine/smart contract integration. A monitoring ancillary service 20942 may include monitoring smart contract term consumption, usage, user ratings, and the like. By monitoring these aspects of use of the platform, the analytics capabilities may be used to determine contextual information about contract terms that might be useful in improving platform performance. In an example, it may be determined, by analysis of monitored contract term usage, that certain contract terms are more popular, that some contract terms are applied across a wide range (or narrow range) of types of contracts, and/or that contract success may be impacted by some terms more than others. These are just a few of the potential outcomes and insights possible when combining monitoring with analytics capabilities.

In embodiments, monitoring ancillary services 20942 may also facilitate monitoring platform component integrity and security. In an example, the gaming engine system 20902 may work with the intelligence layer 21100, data processing system 20930, and the like during one or more of the phases of gaming engine smart contract development and execution to ensure, among other things, regulatory and other types of compliance. The analytics and reporting system 20940 includes monitoring and analytical capabilities that enable fraud detection, reporting, and verification of remediation (e.g., by monitoring for additional occurrences of a remediated fraud condition). In examples, smart contract elements may be monitored; based on the monitoring, certain types of fraudulent smart contract elements may be identified (e.g., internally or externally). In embodiments, remedial action may be taken. Also, such elements may be listed in a fraud element library to facilitate preventing future use, much like isolating a computer virus. In another example, the smart contract execution system may employ one or more services of the intelligence layer 21100 (e.g., artificial intelligence, machine learning, and the like) together with the analytics and reporting system 20940 to identify and monitor data anomalies that could be the result of fraud.

Combinations of embodiments are contemplated in yet further embodiments.

In embodiments, provided herein is a platform for integrating a set of gaming engines and a set of smart contract services in a common execution framework. In embodiments, provided herein is a platform for integrating a set of gaming engines and a set of smart contract services in a common execution framework and having an interface for a user to at least one of operate, maintain, update, improve, or integrate the platform. In embodiments, provided herein is a platform for integrating a set of gaming engines and a set of smart contract services in a common execution framework and having a smart contract that renders a visual representation of at least one of objects or events associated with the smart contract. In embodiments, provided herein is a platform for integrating a set of gaming engines and a set of smart contract services in a common execution framework and having a set of gaming engines for rendering a visualization associated with a smart contract. In embodiments, provided herein is a platform for integrating a set of gaming engines and a set of smart contract services in a common execution framework and having a set of gaming engines for generating and/or presenting a marketplace-related data story. In embodiments, provided herein is a platform for integrating a set of gaming engines and a set of smart contract services in a common execution framework and having a cryptocurrency system for enabling the trading of cryptocurrencies. In embodiments, provided herein is a platform for integrating a set of gaming engines and a set of smart contract services in a common execution framework and having a smart contract system for enabling the creation of smart contracts. In embodiments, provided herein is a platform for integrating a set of gaming engines and a set of smart contract services in a common execution framework and having a smart digital wallet for storing funds. In embodiments, provided herein is a platform for integrating a set of gaming engines and a set of smart contract services in a common execution framework and having a verification system for verifying that a party has performed one or more obligations of a smart contract. In embodiments, provided herein is a platform for integrating a set of gaming engines and a set of smart contract services in a common execution framework and having a distributed ledger for recording electronic transactions. In embodiments, provided herein is a platform for integrating a set of gaming engines and a set of smart contract services in a common execution framework and having an AI-driven system for automatically configuring a smart contract. In embodiments, provided herein is a platform for integrating a set of gaming engines and a set of smart contract services in a common execution framework and having a machine learning and/or artificial intelligence system for detecting performance of a contract. In embodiments, provided herein is a platform for integrating a set of gaming engines and a set of smart contract services in a common execution framework and having a machine learning and/or artificial intelligence system configured to provide governance and compliance support. In embodiments, provided herein is a platform for integrating a set of gaming engines and a set of smart contract services in a common execution framework and having a machine learning and/or artificial intelligence system for categorizing transactions. In embodiments, provided herein is a platform for integrating a set of gaming engines and a set of smart contract services in a common execution framework and having intelligent agents for undertaking workflows related to smart contract configuration. In embodiments, provided herein is a platform for integrating a set of gaming engines and a set of smart contract services in a common execution framework and having intelligent agents for negotiating contract terms. In embodiments, provided herein is a platform for integrating a set of gaming engines and a set of smart contract services in a common execution framework and having intelligent agents for getting other agents. In embodiments, provided herein is a platform for integrating a set of gaming engines and a set of smart contract services in a common execution framework and having intelligent agents for recognizing a target. In embodiments, provided herein is a platform for integrating a set of gaming engines and a set of smart contract services in a common execution framework and having simulation systems. In embodiments, provided herein is a platform for integrating a set of gaming engines and a set of smart contract services in a common execution framework and having a fraud detection system. In embodiments, provided herein is a platform for integrating a set of gaming engines and a set of smart contract services in a common execution framework and having a configuration and management system. In embodiments, provided herein is a platform for integrating a set of gaming engines and a set of smart contract services in a common execution framework and having a digital twin and a digital twin user interface for user interaction with the digital twin. In embodiments, provided herein is a platform for integrating a set of gaming engines and a set of smart contract services in a common execution framework and having a marketing and/or advertising system. In embodiments, provided herein is a platform for integrating a set of gaming engines and a set of smart contract services in a common execution framework and having at least one of an augmented reality interface, a virtual reality interface, or a mixed reality interface for the digital twin system. In embodiments, provided herein is a platform for integrating a set of gaming engines and a set of smart contract services in a common execution framework and having an in-twin marketplace system. In embodiments, provided herein is a platform for integrating a set of gaming engines and a set of smart contract services in a common execution framework and having a system for integrating with at least one hardware or software system to provide at least one of end-user or automated services.

In embodiments, provided herein is a platform for integrating a set of gaming engines and a set of smart contract services in a common execution framework having an interface for a user to at least one of operate, maintain, update, improve, or integrate the platform. In embodiments, provided herein is a platform for integrating a set of gaming engines and a set of smart contract services in a common execution framework having an interface for a user to at least one of operate, maintain, update, improve, or integrate the platform and having a smart contract that renders a visual representation of at least one of objects or events associated with the smart contract. In embodiments, provided herein is a platform for integrating a set of gaming engines and a set of smart contract services in a common execution framework having an interface for a user to at least one of operate, maintain, update, improve, or integrate the platform and having a set of gaming engines for rendering a visualization associated with a smart contract. In embodiments, provided herein is a platform for integrating a set of gaming engines and a set of smart contract services in a common execution framework having an interface for a user to at least one of operate, maintain, update, improve, or integrate the platform and having a set of gaming engines for generating and/or presenting a marketplace-related data story. In embodiments, provided herein is a platform for integrating a set of gaming engines and a set of smart contract services in a common execution framework having an interface for a user to at least one of operate, maintain, update, improve, or integrate the platform and having a cryptocurrency system for enabling the trading of cryptocurrencies. In embodiments, provided herein is a platform for integrating a set of gaming engines and a set of smart contract services in a common execution framework having an interface for a user to at least one of operate, maintain, update, improve, or integrate the platform and having a smart contract system for enabling the creation of smart contracts. In embodiments, provided herein is a platform for integrating a set of gaming engines and a set of smart contract services in a common execution framework having an interface for a user to at least one of operate, maintain, update, improve, or integrate the platform and having a smart digital wallet for storing funds. In embodiments, provided herein is a platform for integrating a set of gaming engines and a set of smart contract services in a common execution framework having an interface for a user to at least one of operate, maintain, update, improve, or integrate the platform and having a verification system for verifying that a party has performed one or more obligations of a smart contract. In embodiments, provided herein is a platform for integrating a set of gaming engines and a set of smart contract services in a common execution framework having an interface for a user to at least one of operate, maintain, update, improve, or integrate the platform and having a distributed ledger for recording electronic transactions. In embodiments, provided herein is a platform for integrating a set of gaming engines and a set of smart contract services in a common execution framework having an interface for a user to at least one of operate, maintain, update, improve, or integrate the platform and having an AI-driven system for automatically configuring a smart contract. In embodiments, provided herein is a platform for integrating a set of gaming engines and a set of smart contract services in a common execution framework having an interface for a user to at least one of operate, maintain, update, improve, or integrate the platform and having a machine learning and/or artificial intelligence system for detecting performance of a contract. In embodiments, provided herein is a platform for integrating a set of gaming engines and a set of smart contract services in a common execution framework having an interface for a user to at least one of operate, maintain, update, improve, or integrate the platform and having a machine learning and/or artificial intelligence system configured to provide governance and compliance support. In embodiments, provided herein is a platform for integrating a set of gaming engines and a set of smart contract services in a common execution framework having an interface for a user to at least one of operate, maintain, update, improve, or integrate the platform and having a machine learning and/or artificial intelligence system for categorizing transactions. In embodiments, provided herein is a platform for integrating a set of gaming engines and a set of smart contract services in a common execution framework having an interface for a user to at least one of operate, maintain, update, improve, or integrate the platform and having intelligent agents for undertaking workflows related to smart contract configuration. In embodiments, provided herein is a platform for integrating a set of gaming engines and a set of smart contract services in a common execution framework having an interface for a user to at least one of operate, maintain, update, improve, or integrate the platform and having intelligent agents for negotiating contract terms. In embodiments, provided herein is a platform for integrating a set of gaming engines and a set of smart contract services in a common execution framework having an interface for a user to at least one of operate, maintain, update, improve, or integrate the platform and having intelligent agents for getting other agents. In embodiments, provided herein is a platform for integrating a set of gaming engines and a set of smart contract services in a common execution framework having an interface for a user to at least one of operate, maintain, update, improve, or integrate the platform and having intelligent agents for recognizing a target. In embodiments, provided herein is a platform for integrating a set of gaming engines and a set of smart contract services in a common execution framework having an interface for a user to at least one of operate, maintain, update, improve, or integrate the platform and having simulation systems. In embodiments, provided herein is a platform for integrating a set of gaming engines and a set of smart contract services in a common execution framework having an interface for a user to at least one of operate, maintain, update, improve, or integrate the platform and having a fraud detection system. In embodiments, provided herein is a platform for integrating a set of gaming engines and a set of smart contract services in a common execution framework having an interface for a user to at least one of operate, maintain, update, improve, or integrate the platform and having a configuration and management system. In embodiments, provided herein is a platform for integrating a set of gaming engines and a set of smart contract services in a common execution framework having an interface for a user to at least one of operate, maintain, update, improve, or integrate the platform and having a digital twin and a digital twin user interface for user interaction with the digital twin. In embodiments, provided herein is a platform for integrating a set of gaming engines and a set of smart contract services in a common execution framework having an interface for a user to at least one of operate, maintain, update, improve, or integrate the platform and having a marketing and/or advertising system. In embodiments, provided herein is a platform for integrating a set of gaming engines and a set of smart contract services in a common execution framework having an interface for a user to at least one of operate, maintain, update, improve, or integrate the platform and having at least one of an augmented reality interface, a virtual reality interface, or a mixed reality interface for the digital twin system. In embodiments, provided herein is a platform for integrating a set of gaming engines and a set of smart contract services in a common execution framework having an interface for a user to at least one of operate, maintain, update, improve, or integrate the platform and having an in-twin marketplace system. In embodiments, provided herein is a platform for integrating a set of gaming engines and a set of smart contract services in a common execution framework having an interface for a user to at least one of operate, maintain, update, improve, or integrate the platform and having a system for integrating with at least one hardware or software system to provide at least one of end-user or automated services.

In embodiments, provided herein is a platform for integrating a set of gaming engines and a set of smart contract services in a common execution framework having a smart contract that renders a visual representation of at least one of objects or events associated with the smart contract. In embodiments, provided herein is a platform for integrating a set of gaming engines and a set of smart contract services in a common execution framework having a smart contract that renders a visual representation of at least one of objects or events associated with the smart contract and having a set of gaming engines for rendering a visualization associated with a smart contract. In embodiments, provided herein is a platform for integrating a set of gaming engines and a set of smart contract services in a common execution framework having a smart contract that renders a visual representation of at least one of objects or events associated with the smart contract and having a set of gaming engines for generating and/or presenting a marketplace-related data story. In embodiments, provided herein is a platform for integrating a set of gaming engines and a set of smart contract services in a common execution framework having a smart contract that renders a visual representation of at least one of objects or events associated with the smart contract and having a cryptocurrency system for enabling the trading of cryptocurrencies. In embodiments, provided herein is a platform for integrating a set of gaming engines and a set of smart contract services in a common execution framework having a smart contract that renders a visual representation of at least one of objects or events associated with the smart contract and having a smart contract system for enabling the creation of smart contracts. In embodiments, provided herein is a platform for integrating a set of gaming engines and a set of smart contract services in a common execution framework having a smart contract that renders a visual representation of at least one of objects or events associated with the smart contract and having a smart digital wallet for storing funds. In embodiments, provided herein is a platform for integrating a set of gaming engines and a set of smart contract services in a common execution framework having a smart contract that renders a visual representation of at least one of objects or events associated with the smart contract and having a verification system for verifying that a party has performed one or more obligations of a smart contract. In embodiments, provided herein is a platform for integrating a set of gaming engines and a set of smart contract services in a common execution framework having a smart contract that renders a visual representation of at least one of objects or events associated with the smart contract and having a distributed ledger for recording electronic transactions. In embodiments, provided herein is a platform for integrating a set of gaming engines and a set of smart contract services in a common execution framework having a smart contract that renders a visual representation of at least one of objects or events associated with the smart contract and having an AI-driven system for automatically configuring a smart contract. In embodiments, provided herein is a platform for integrating a set of gaming engines and a set of smart contract services in a common execution framework having a smart contract that renders a visual representation of at least one of objects or events associated with the smart contract and having a machine learning and/or artificial intelligence system for detecting performance of a contract. In embodiments, provided herein is a platform for integrating a set of gaming engines and a set of smart contract services in a common execution framework having a smart contract that renders a visual representation of at least one of objects or events associated with the smart contract and having a machine learning and/or artificial intelligence system configured to provide governance and compliance support. In embodiments, provided herein is a platform for integrating a set of gaming engines and a set of smart contract services in a common execution framework having a smart contract that renders a visual representation of at least one of objects or events associated with the smart contract and having a machine learning and/or artificial intelligence system for categorizing transactions. In embodiments, provided herein is a platform for integrating a set of gaming engines and a set of smart contract services in a common execution framework having a smart contract that renders a visual representation of at least one of objects or events associated with the smart contract and having intelligent agents for undertaking workflows related to smart contract configuration. In embodiments, provided herein is a platform for integrating a set of gaming engines and a set of smart contract services in a common execution framework having a smart contract that renders a visual representation of at least one of objects or events associated with the smart contract and having intelligent agents for negotiating contract terms. In embodiments, provided herein is a platform for integrating a set of gaming engines and a set of smart contract services in a common execution framework having a smart contract that renders a visual representation of at least one of objects or events associated with the smart contract and having intelligent agents for getting other agents. In embodiments, provided herein is a platform for integrating a set of gaming engines and a set of smart contract services in a common execution framework having a smart contract that renders a visual representation of at least one of objects or events associated with the smart contract and having intelligent agents for recognizing a target. In embodiments, provided herein is a platform for integrating a set of gaming engines and a set of smart contract services in a common execution framework having a smart contract that renders a visual representation of at least one of objects or events associated with the smart contract and having simulation systems. In embodiments, provided herein is a platform for integrating a set of gaming engines and a set of smart contract services in a common execution framework having a smart contract that renders a visual representation of at least one of objects or events associated with the smart contract and having a fraud detection system. In embodiments, provided herein is a platform for integrating a set of gaming engines and a set of smart contract services in a common execution framework having a smart contract that renders a visual representation of at least one of objects or events associated with the smart contract and having a configuration and management system. In embodiments, provided herein is a platform for integrating a set of gaming engines and a set of smart contract services in a common execution framework having a smart contract that renders a visual representation of at least one of objects or events associated with the smart contract and having a digital twin and a digital twin user interface for user interaction with the digital twin. In embodiments, provided herein is a platform for integrating a set of gaming engines and a set of smart contract services in a common execution framework having a smart contract that renders a visual representation of at least one of objects or events associated with the smart contract and having a marketing and/or advertising system. In embodiments, provided herein is a platform for integrating a set of gaming engines and a set of smart contract services in a common execution framework having a smart contract that renders a visual representation of at least one of objects or events associated with the smart contract and having at least one of an augmented reality interface, a virtual reality interface, or a mixed reality interface for the digital twin system. In embodiments, provided herein is a platform for integrating a set of gaming engines and a set of smart contract services in a common execution framework having a smart contract that renders a visual representation of at least one of objects or events associated with the smart contract and having an in-twin marketplace system. In embodiments, provided herein is a platform for integrating a set of gaming engines and a set of smart contract services in a common execution framework having a smart contract that renders a visual representation of at least one of objects or events associated with the smart contract and having a system for integrating with at least one hardware or software system to provide at least one of end-user or automated services.

In embodiments, provided herein is a platform for integrating a set of gaming engines and a set of smart contract services in a common execution framework having a set of gaming engines for rendering a visualization associated with a smart contract. In embodiments, provided herein is a platform for integrating a set of gaming engines and a set of smart contract services in a common execution framework having a set of gaming engines for rendering a visualization associated with a smart contract and having a set of gaming engines for generating and/or presenting a marketplace-related data story. In embodiments, provided herein is a platform for integrating a set of gaming engines and a set of smart contract services in a common execution framework having a set of gaming engines for rendering a visualization associated with a smart contract and having a cryptocurrency system for enabling the trading of cryptocurrencies. In embodiments, provided herein is a platform for integrating a set of gaming engines and a set of smart contract services in a common execution framework having a set of gaming engines for rendering a visualization associated with a smart contract and having a smart contract system for enabling the creation of smart contracts. In embodiments, provided herein is a platform for integrating a set of gaming engines and a set of smart contract services in a common execution framework having a set of gaming engines for rendering a visualization associated with a smart contract and having a smart digital wallet for storing funds. In embodiments, provided herein is a platform for integrating a set of gaming engines and a set of smart contract services in a common execution framework having a set of gaming engines for rendering a visualization associated with a smart contract and having a verification system for verifying that a party has performed one or more obligations of a smart contract. In embodiments, provided herein is a platform for integrating a set of gaming engines and a set of smart contract services in a common execution framework having a set of gaming engines for rendering a visualization associated with a smart contract and having a distributed ledger for recording electronic transactions. In embodiments, provided herein is a platform for integrating a set of gaming engines and a set of smart contract services in a common execution framework having a set of gaming engines for rendering a visualization associated with a smart contract and having an AI-driven system for automatically configuring a smart contract. In embodiments, provided herein is a platform for integrating a set of gaming engines and a set of smart contract services in a common execution framework having a set of gaming engines for rendering a visualization associated with a smart contract and having a machine learning and/or artificial intelligence system for detecting performance of a contract. In embodiments, provided herein is a platform for integrating a set of gaming engines and a set of smart contract services in a common execution framework having a set of gaming engines for rendering a visualization associated with a smart contract and having a machine learning and/or artificial intelligence system configured to provide governance and compliance support. In embodiments, provided herein is a platform for integrating a set of gaming engines and a set of smart contract services in a common execution framework having a set of gaming engines for rendering a visualization associated with a smart contract and having a machine learning and/or artificial intelligence system for categorizing transactions. In embodiments, provided herein is a platform for integrating a set of gaming engines and a set of smart contract services in a common execution framework having a set of gaming engines for rendering a visualization associated with a smart contract and having intelligent agents for undertaking workflows related to smart contract configuration. In embodiments, provided herein is a platform for integrating a set of gaming engines and a set of smart contract services in a common execution framework having a set of gaming engines for rendering a visualization associated with a smart contract and having intelligent agents for negotiating contract terms. In embodiments, provided herein is a platform for integrating a set of gaming engines and a set of smart contract services in a common execution framework having a set of gaming engines for rendering a visualization associated with a smart contract and having intelligent agents for getting other agents. In embodiments, provided herein is a platform for integrating a set of gaming engines and a set of smart contract services in a common execution framework having a set of gaming engines for rendering a visualization associated with a smart contract and having intelligent agents for recognizing a target. In embodiments, provided herein is a platform for integrating a set of gaming engines and a set of smart contract services in a common execution framework having a set of gaming engines for rendering a visualization associated with a smart contract and having simulation systems. In embodiments, provided herein is a platform for integrating a set of gaming engines and a set of smart contract services in a common execution framework having a set of gaming engines for rendering a visualization associated with a smart contract and having a fraud detection system. In embodiments, provided herein is a platform for integrating a set of gaming engines and a set of smart contract services in a common execution framework having a set of gaming engines for rendering a visualization associated with a smart contract and having a configuration and management system. In embodiments, provided herein is a platform for integrating a set of gaming engines and a set of smart contract services in a common execution framework having a set of gaming engines for rendering a visualization associated with a smart contract and having a digital twin and a digital twin user interface for user interaction with the digital twin. In embodiments, provided herein is a platform for integrating a set of gaming engines and a set of smart contract services in a common execution framework having a set of gaming engines for rendering a visualization associated with a smart contract and having a marketing and/or advertising system. In embodiments, provided herein is a platform for integrating a set of gaming engines and a set of smart contract services in a common execution framework having a set of gaming engines for rendering a visualization associated with a smart contract and having at least one of an augmented reality interface, a virtual reality interface, or a mixed reality interface for the digital twin system. In embodiments, provided herein is a platform for integrating a set of gaming engines and a set of smart contract services in a common execution framework having a set of gaming engines for rendering a visualization associated with a smart contract and having an in-twin marketplace system. In embodiments, provided herein is a platform for integrating a set of gaming engines and a set of smart contract services in a common execution framework having a set of gaming engines for rendering a visualization associated with a smart contract and having a system for integrating with at least one hardware or software system to provide at least one of end-user or automated services.

In embodiments, provided herein is a platform for integrating a set of gaming engines and a set of smart contract services in a common execution framework having a set of gaming engines for generating and/or presenting a marketplace-related data story. In embodiments, provided herein is a platform for integrating a set of gaming engines and a set of smart contract services in a common execution framework having a set of gaming engines for generating and/or presenting a marketplace-related data story and having a cryptocurrency system for enabling the trading of cryptocurrencies. In embodiments, provided herein is a platform for integrating a set of gaming engines and a set of smart contract services in a common execution framework having a set of gaming engines for generating and/or presenting a marketplace-related data story and having a smart contract system for enabling the creation of smart contracts. In embodiments, provided herein is a platform for integrating a set of gaming engines and a set of smart contract services in a common execution framework having a set of gaming engines for generating and/or presenting a marketplace-related data story and having a smart digital wallet for storing funds. In embodiments, provided herein is a platform for integrating a set of gaming engines and a set of smart contract services in a common execution framework having a set of gaming engines for generating and/or presenting a marketplace-related data story and having a verification system for verifying that a party has performed one or more obligations of a smart contract. In embodiments, provided herein is a platform for integrating a set of gaming engines and a set of smart contract services in a common execution framework having a set of gaming engines for generating and/or presenting a marketplace-related data story and having a distributed ledger for recording electronic transactions. In embodiments, provided herein is a platform for integrating a set of gaming engines and a set of smart contract services in a common execution framework having a set of gaming engines for generating and/or presenting a marketplace-related data story and having an AI-driven system for automatically configuring a smart contract. In embodiments, provided herein is a platform for integrating a set of gaming engines and a set of smart contract services in a common execution framework having a set of gaming engines for generating and/or presenting a marketplace-related data story and having a machine learning and/or artificial intelligence system for detecting performance of a contract. In embodiments, provided herein is a platform for integrating a set of gaming engines and a set of smart contract services in a common execution framework having a set of gaming engines for generating and/or presenting a marketplace-related data story and having a machine learning and/or artificial intelligence system configured to provide governance and compliance support. In embodiments, provided herein is a platform for integrating a set of gaming engines and a set of smart contract services in a common execution framework having a set of gaming engines for generating and/or presenting a marketplace-related data story and having a machine learning and/or artificial intelligence system for categorizing transactions. In embodiments, provided herein is a platform for integrating a set of gaming engines and a set of smart contract services in a common execution framework having a set of gaming engines for generating and/or presenting a marketplace-related data story and having intelligent agents for undertaking workflows related to smart contract configuration. In embodiments, provided herein is a platform for integrating a set of gaming engines and a set of smart contract services in a common execution framework having a set of gaming engines for generating and/or presenting a marketplace-related data story and having intelligent agents for negotiating contract terms. In embodiments, provided herein is a platform for integrating a set of gaming engines and a set of smart contract services in a common execution framework having a set of gaming engines for generating and/or presenting a marketplace-related data story and having intelligent agents for getting other agents. In embodiments, provided herein is a platform for integrating a set of gaming engines and a set of smart contract services in a common execution framework having a set of gaming engines for generating and/or presenting a marketplace-related data story and having intelligent agents for recognizing a target. In embodiments, provided herein is a platform for integrating a set of gaming engines and a set of smart contract services in a common execution framework having a set of gaming engines for generating and/or presenting a marketplace-related data story and having simulation systems. In embodiments, provided herein is a platform for integrating a set of gaming engines and a set of smart contract services in a common execution framework having a set of gaming engines for generating and/or presenting a marketplace-related data story and having a fraud detection system. In embodiments, provided herein is a platform for integrating a set of gaming engines and a set of smart contract services in a common execution framework having a set of gaming engines for generating and/or presenting a marketplace-related data story and having a configuration and management system. In embodiments, provided herein is a platform for integrating a set of gaming engines and a set of smart contract services in a common execution framework having a set of gaming engines for generating and/or presenting a marketplace-related data story and having a digital twin and a digital twin user interface for user interaction with the digital twin. In embodiments, provided herein is a platform for integrating a set of gaming engines and a set of smart contract services in a common execution framework having a set of gaming engines for generating and/or presenting a marketplace-related data story and having a marketing and/or advertising system. In embodiments, provided herein is a platform for integrating a set of gaming engines and a set of smart contract services in a common execution framework having a set of gaming engines for generating and/or presenting a marketplace-related data story and having at least one of an augmented reality interface, a virtual reality interface, or a mixed reality interface for the digital twin system. In embodiments, provided herein is a platform for integrating a set of gaming engines and a set of smart contract services in a common execution framework having a set of gaming engines for generating and/or presenting a marketplace-related data story and having an in-twin marketplace system. In embodiments, provided herein is a platform for integrating a set of gaming engines and a set of smart contract services in a common execution framework having a set of gaming engines for generating and/or presenting a marketplace-related data story and having a system for integrating with at least one hardware or software system to provide at least one of end-user or automated services.

In embodiments, provided herein is a platform for integrating a set of gaming engines and a set of smart contract services in a common execution framework having a cryptocurrency system for enabling the trading of cryptocurrencies. In embodiments, provided herein is a platform for integrating a set of gaming engines and a set of smart contract services in a common execution framework having a cryptocurrency system for enabling the trading of cryptocurrencies and having a smart contract system for enabling the creation of smart contracts. In embodiments, provided herein is a platform for integrating a set of gaming engines and a set of smart contract services in a common execution framework having a cryptocurrency system for enabling the trading of cryptocurrencies and having a smart digital wallet for storing funds. In embodiments, provided herein is a platform for integrating a set of gaming engines and a set of smart contract services in a common execution framework having a cryptocurrency system for enabling the trading of cryptocurrencies and having a verification system for verifying that a party has performed one or more obligations of a smart contract. In embodiments, provided herein is a platform for integrating a set of gaming engines and a set of smart contract services in a common execution framework having a cryptocurrency system for enabling the trading of cryptocurrencies and having a distributed ledger for recording electronic transactions. In embodiments, provided herein is a platform for integrating a set of gaming engines and a set of smart contract services in a common execution framework having a cryptocurrency system for enabling the trading of cryptocurrencies and having an AI-driven system for automatically configuring a smart contract. In embodiments, provided herein is a platform for integrating a set of gaming engines and a set of smart contract services in a common execution framework having a cryptocurrency system for enabling the trading of cryptocurrencies and having a machine learning and/or artificial intelligence system for detecting performance of a contract. In embodiments, provided herein is a platform for integrating a set of gaming engines and a set of smart contract services in a common execution framework having a cryptocurrency system for enabling the trading of cryptocurrencies and having a machine learning and/or artificial intelligence system configured to provide governance and compliance support. In embodiments, provided herein is a platform for integrating a set of gaming engines and a set of smart contract services in a common execution framework having a cryptocurrency system for enabling the trading of cryptocurrencies and having a machine learning and/or artificial intelligence system for categorizing transactions. In embodiments, provided herein is a platform for integrating a set of gaming engines and a set of smart contract services in a common execution framework having a cryptocurrency system for enabling the trading of cryptocurrencies and having intelligent agents for undertaking workflows related to smart contract configuration. In embodiments, provided herein is a platform for integrating a set of gaming engines and a set of smart contract services in a common execution framework having a cryptocurrency system for enabling the trading of cryptocurrencies and having intelligent agents for negotiating contract terms. In embodiments, provided herein is a platform for integrating a set of gaming engines and a set of smart contract services in a common execution framework having a cryptocurrency system for enabling the trading of cryptocurrencies and having intelligent agents for getting other agents. In embodiments, provided herein is a platform for integrating a set of gaming engines and a set of smart contract services in a common execution framework having a cryptocurrency system for enabling the trading of cryptocurrencies and having intelligent agents for recognizing a target. In embodiments, provided herein is a platform for integrating a set of gaming engines and a set of smart contract services in a common execution framework having a cryptocurrency system for enabling the trading of cryptocurrencies and having simulation systems. In embodiments, provided herein is a platform for integrating a set of gaming engines and a set of smart contract services in a common execution framework having a cryptocurrency system for enabling the trading of cryptocurrencies and having a fraud detection system. In embodiments, provided herein is a platform for integrating a set of gaming engines and a set of smart contract services in a common execution framework having a cryptocurrency system for enabling the trading of cryptocurrencies and having a configuration and management system. In embodiments, provided herein is a platform for integrating a set of gaming engines and a set of smart contract services in a common execution framework having a cryptocurrency system for enabling the trading of cryptocurrencies and having a digital twin and a digital twin user interface for user interaction with the digital twin. In embodiments, provided herein is a platform for integrating a set of gaming engines and a set of smart contract services in a common execution framework having a cryptocurrency system for enabling the trading of cryptocurrencies and having a marketing and/or advertising system. In embodiments, provided herein is a platform for integrating a set of gaming engines and a set of smart contract services in a common execution framework having a cryptocurrency system for enabling the trading of cryptocurrencies and having at least one of an augmented reality interface, a virtual reality interface, or a mixed reality interface for the digital twin system. In embodiments, provided herein is a platform for integrating a set of gaming engines and a set of smart contract services in a common execution framework having a cryptocurrency system for enabling the trading of cryptocurrencies and having an in-twin marketplace system. In embodiments, provided herein is a platform for integrating a set of gaming engines and a set of smart contract services in a common execution framework having a cryptocurrency system for enabling the trading of cryptocurrencies and having a system for integrating with at least one hardware or software system to provide at least one of end-user or automated services.

In embodiments, provided herein is a platform for integrating a set of gaming engines and a set of smart contract services in a common execution framework having a smart contract system for enabling the creation of smart contracts. In embodiments, provided herein is a platform for integrating a set of gaming engines and a set of smart contract services in a common execution framework having a smart contract system for enabling the creation of smart contracts and having a smart digital wallet for storing funds. In embodiments, provided herein is a platform for integrating a set of gaming engines and a set of smart contract services in a common execution framework having a smart contract system for enabling the creation of smart contracts and having a verification system for verifying that a party has performed one or more obligations of a smart contract. In embodiments, provided herein is a platform for integrating a set of gaming engines and a set of smart contract services in a common execution framework having a smart contract system for enabling the creation of smart contracts and having a distributed ledger for recording electronic transactions. In embodiments, provided herein is a platform for integrating a set of gaming engines and a set of smart contract services in a common execution framework having a smart contract system for enabling the creation of smart contracts and having an AI-driven system for automatically configuring a smart contract. In embodiments, provided herein is a platform for integrating a set of gaming engines and a set of smart contract services in a common execution framework having a smart contract system for enabling the creation of smart contracts and having a machine learning and/or artificial intelligence system for detecting performance of a contract. In embodiments, provided herein is a platform for integrating a set of gaming engines and a set of smart contract services in a common execution framework having a smart contract system for enabling the creation of smart contracts and having a machine learning and/or artificial intelligence system configured to provide governance and compliance support. In embodiments, provided herein is a platform for integrating a set of gaming engines and a set of smart contract services in a common execution framework having a smart contract system for enabling the creation of smart contracts and having a machine learning and/or artificial intelligence system for categorizing transactions. In embodiments, provided herein is a platform for integrating a set of gaming engines and a set of smart contract services in a common execution framework having a smart contract system for enabling the creation of smart contracts and having intelligent agents for undertaking workflows related to smart contract configuration. In embodiments, provided herein is a platform for integrating a set of gaming engines and a set of smart contract services in a common execution framework having a smart contract system for enabling the creation of smart contracts and having intelligent agents for negotiating contract terms. In embodiments, provided herein is a platform for integrating a set of gaming engines and a set of smart contract services in a common execution framework having a smart contract system for enabling the creation of smart contracts and having intelligent agents for getting other agents. In embodiments, provided herein is a platform for integrating a set of gaming engines and a set of smart contract services in a common execution framework having a smart contract system for enabling the creation of smart contracts and having intelligent agents for recognizing a target. In embodiments, provided herein is a platform for integrating a set of gaming engines and a set of smart contract services in a common execution framework having a smart contract system for enabling the creation of smart contracts and having simulation systems. In embodiments, provided herein is a platform for integrating a set of gaming engines and a set of smart contract services in a common execution framework having a smart contract system for enabling the creation of smart contracts and having a fraud detection system. In embodiments, provided herein is a platform for integrating a set of gaming engines and a set of smart contract services in a common execution framework having a smart contract system for enabling the creation of smart contracts and having a configuration and management system. In embodiments, provided herein is a platform for integrating a set of gaming engines and a set of smart contract services in a common execution framework having a smart contract system for enabling the creation of smart contracts and having a digital twin and a digital twin user interface for user interaction with the digital twin. In embodiments, provided herein is a platform for integrating a set of gaming engines and a set of smart contract services in a common execution framework having a smart contract system for enabling the creation of smart contracts and having a marketing and/or advertising system. In embodiments, provided herein is a platform for integrating a set of gaming engines and a set of smart contract services in a common execution framework having a smart contract system for enabling the creation of smart contracts and having at least one of an augmented reality interface, a virtual reality interface, or a mixed reality interface for the digital twin system. In embodiments, provided herein is a platform for integrating a set of gaming engines and a set of smart contract services in a common execution framework having a smart contract system for enabling the creation of smart contracts and having an in-twin marketplace system. In embodiments, provided herein is a platform for integrating a set of gaming engines and a set of smart contract services in a common execution framework having a smart contract system for enabling the creation of smart contracts and having a system for integrating with at least one hardware or software system to provide at least one of end-user or automated services.

In embodiments, provided herein is a platform for integrating a set of gaming engines and a set of smart contract services in a common execution framework having a smart digital wallet for storing funds. In embodiments, provided herein is a platform for integrating a set of gaming engines and a set of smart contract services in a common execution framework having a smart digital wallet for storing funds and having a verification system for verifying that a party has performed one or more obligations of a smart contract. In embodiments, provided herein is a platform for integrating a set of gaming engines and a set of smart contract services in a common execution framework having a smart digital wallet for storing funds and having a distributed ledger for recording electronic transactions. In embodiments, provided herein is a platform for integrating a set of gaming engines and a set of smart contract services in a common execution framework having a smart digital wallet for storing funds and having an AI-driven system for automatically configuring a smart contract. In embodiments, provided herein is a platform for integrating a set of gaming engines and a set of smart contract services in a common execution framework having a smart digital wallet for storing funds and having a machine learning and/or artificial intelligence system for detecting performance of a contract. In embodiments, provided herein is a platform for integrating a set of gaming engines and a set of smart contract services in a common execution framework having a smart digital wallet for storing funds and having a machine learning and/or artificial intelligence system configured to provide governance and compliance support. In embodiments, provided herein is a platform for integrating a set of gaming engines and a set of smart contract services in a common execution framework having a smart digital wallet for storing funds and having a machine learning and/or artificial intelligence system for categorizing transactions. In embodiments, provided herein is a platform for integrating a set of gaming engines and a set of smart contract services in a common execution framework having a smart digital wallet for storing funds and having intelligent agents for undertaking workflows related to smart contract configuration. In embodiments, provided herein is a platform for integrating a set of gaming engines and a set of smart contract services in a common execution framework having a smart digital wallet for storing funds and having intelligent agents for negotiating contract terms. In embodiments, provided herein is a platform for integrating a set of gaming engines and a set of smart contract services in a common execution framework having a smart digital wallet for storing funds and having intelligent agents for getting other agents. In embodiments, provided herein is a platform for integrating a set of gaming engines and a set of smart contract services in a common execution framework having a smart digital wallet for storing funds and having intelligent agents for recognizing a target. In embodiments, provided herein is a platform for integrating a set of gaming engines and a set of smart contract services in a common execution framework having a smart digital wallet for storing funds and having simulation systems. In embodiments, provided herein is a platform for integrating a set of gaming engines and a set of smart contract services in a common execution framework having a smart digital wallet for storing funds and having a fraud detection system. In embodiments, provided herein is a platform for integrating a set of gaming engines and a set of smart contract services in a common execution framework having a smart digital wallet for storing funds and having a configuration and management system. In embodiments, provided herein is a platform for integrating a set of gaming engines and a set of smart contract services in a common execution framework having a smart digital wallet for storing funds and having a digital twin and a digital twin user interface for user interaction with the digital twin. In embodiments, provided herein is a platform for integrating a set of gaming engines and a set of smart contract services in a common execution framework having a smart digital wallet for storing funds and having a marketing and/or advertising system. In embodiments, provided herein is a platform for integrating a set of gaming engines and a set of smart contract services in a common execution framework having a smart digital wallet for storing funds and having at least one of an augmented reality interface, a virtual reality interface, or a mixed reality interface for the digital twin system. In embodiments, provided herein is a platform for integrating a set of gaming engines and a set of smart contract services in a common execution framework having a smart digital wallet for storing funds and having an in-twin marketplace system. In embodiments, provided herein is a platform for integrating a set of gaming engines and a set of smart contract services in a common execution framework having a smart digital wallet for storing funds and having a system for integrating with at least one hardware or software system to provide at least one of end-user or automated services.

In embodiments, provided herein is a platform for integrating a set of gaming engines and a set of smart contract services in a common execution framework having a verification system for verifying that a party has performed one or more obligations of a smart contract. In embodiments, provided herein is a platform for integrating a set of gaming engines and a set of smart contract services in a common execution framework having a verification system for verifying that a party has performed one or more obligations of a smart contract and having a distributed ledger for recording electronic transactions. In embodiments, provided herein is a platform for integrating a set of gaming engines and a set of smart contract services in a common execution framework having a verification system for verifying that a party has performed one or more obligations of a smart contract and having an AI-driven system for automatically configuring a smart contract. In embodiments, provided herein is a platform for integrating a set of gaming engines and a set of smart contract services in a common execution framework having a verification system for verifying that a party has performed one or more obligations of a smart contract and having a machine learning and/or artificial intelligence system for detecting performance of a contract. In embodiments, provided herein is a platform for integrating a set of gaming engines and a set of smart contract services in a common execution framework having a verification system for verifying that a party has performed one or more obligations of a smart contract and having a machine learning and/or artificial intelligence system configured to provide governance and compliance support. In embodiments, provided herein is a platform for integrating a set of gaming engines and a set of smart contract services in a common execution framework having a verification system for verifying that a party has performed one or more obligations of a smart contract and having a machine learning and/or artificial intelligence system for categorizing transactions. In embodiments, provided herein is a platform for integrating a set of gaming engines and a set of smart contract services in a common execution framework having a verification system for verifying that a party has performed one or more obligations of a smart contract and having intelligent agents for undertaking workflows related to smart contract configuration. In embodiments, provided herein is a platform for integrating a set of gaming engines and a set of smart contract services in a common execution framework having a verification system for verifying that a party has performed one or more obligations of a smart contract and having intelligent agents for negotiating contract terms. In embodiments, provided herein is a platform for integrating a set of gaming engines and a set of smart contract services in a common execution framework having a verification system for verifying that a party has performed one or more obligations of a smart contract and having intelligent agents for getting other agents. In embodiments, provided herein is a platform for integrating a set of gaming engines and a set of smart contract services in a common execution framework having a verification system for verifying that a party has performed one or more obligations of a smart contract and having intelligent agents for recognizing a target. In embodiments, provided herein is a platform for integrating a set of gaming engines and a set of smart contract services in a common execution framework having a verification system for verifying that a party has performed one or more obligations of a smart contract and having simulation systems. In embodiments, provided herein is a platform for integrating a set of gaming engines and a set of smart contract services in a common execution framework having a verification system for verifying that a party has performed one or more obligations of a smart contract and having a fraud detection system. In embodiments, provided herein is a platform for integrating a set of gaming engines and a set of smart contract services in a common execution framework having a verification system for verifying that a party has performed one or more obligations of a smart contract and having a configuration and management system. In embodiments, provided herein is a platform for integrating a set of gaming engines and a set of smart contract services in a common execution framework having a verification system for verifying that a party has performed one or more obligations of a smart contract and having a digital twin and a digital twin user interface for user interaction with the digital twin. In embodiments, provided herein is a platform for integrating a set of gaming engines and a set of smart contract services in a common execution framework having a verification system for verifying that a party has performed one or more obligations of a smart contract and having a marketing and/or advertising system. In embodiments, provided herein is a platform for integrating a set of gaming engines and a set of smart contract services in a common execution framework having a verification system for verifying that a party has performed one or more obligations of a smart contract and having at least one of an augmented reality interface, a virtual reality interface, or a mixed reality interface for the digital twin system. In embodiments, provided herein is a platform for integrating a set of gaming engines and a set of smart contract services in a common execution framework having a verification system for verifying that a party has performed one or more obligations of a smart contract and having an in-twin marketplace system. In embodiments, provided herein is a platform for integrating a set of gaming engines and a set of smart contract services in a common execution framework having a verification system for verifying that a party has performed one or more obligations of a smart contract and having a system for integrating with at least one hardware or software system to provide at least one of end-user or automated services.

In embodiments, provided herein is a platform for integrating a set of gaming engines and a set of smart contract services in a common execution framework having a distributed ledger for recording electronic transactions. In embodiments, provided herein is a platform for integrating a set of gaming engines and a set of smart contract services in a common execution framework having a distributed ledger for recording electronic transactions and having an AI-driven system for automatically configuring a smart contract. In embodiments, provided herein is a platform for integrating a set of gaming engines and a set of smart contract services in a common execution framework having a distributed ledger for recording electronic transactions and having a machine learning and/or artificial intelligence system for detecting performance of a contract. In embodiments, provided herein is a platform for integrating a set of gaming engines and a set of smart contract services in a common execution framework having a distributed ledger for recording electronic transactions and having a machine learning and/or artificial intelligence system configured to provide governance and compliance support. In embodiments, provided herein is a platform for integrating a set of gaming engines and a set of smart contract services in a common execution framework having a distributed ledger for recording electronic transactions and having a machine learning and/or artificial intelligence system for categorizing transactions. In embodiments, provided herein is a platform for integrating a set of gaming engines and a set of smart contract services in a common execution framework having a distributed ledger for recording electronic transactions and having intelligent agents for undertaking workflows related to smart contract configuration. In embodiments, provided herein is a platform for integrating a set of gaming engines and a set of smart contract services in a common execution framework having a distributed ledger for recording electronic transactions and having intelligent agents for negotiating contract terms. In embodiments, provided herein is a platform for integrating a set of gaming engines and a set of smart contract services in a common execution framework having a distributed ledger for recording electronic transactions and having intelligent agents for getting other agents. In embodiments, provided herein is a platform for integrating a set of gaming engines and a set of smart contract services in a common execution framework having a distributed ledger for recording electronic transactions and having intelligent agents for recognizing a target. In embodiments, provided herein is a platform for integrating a set of gaming engines and a set of smart contract services in a common execution framework having a distributed ledger for recording electronic transactions and having simulation systems. In embodiments, provided herein is a platform for integrating a set of gaming engines and a set of smart contract services in a common execution framework having a distributed ledger for recording electronic transactions and having a fraud detection system. In embodiments, provided herein is a platform for integrating a set of gaming engines and a set of smart contract services in a common execution framework having a distributed ledger for recording electronic transactions and having a configuration and management system. In embodiments, provided herein is a platform for integrating a set of gaming engines and a set of smart contract services in a common execution framework having a distributed ledger for recording electronic transactions and having a digital twin and a digital twin user interface for user interaction with the digital twin. In embodiments, provided herein is a platform for integrating a set of gaming engines and a set of smart contract services in a common execution framework having a distributed ledger for recording electronic transactions and having a marketing and/or advertising system. In embodiments, provided herein is a platform for integrating a set of gaming engines and a set of smart contract services in a common execution framework having a distributed ledger for recording electronic transactions and having at least one of an augmented reality interface, a virtual reality interface, or a mixed reality interface for the digital twin system. In embodiments, provided herein is a platform for integrating a set of gaming engines and a set of smart contract services in a common execution framework having a distributed ledger for recording electronic transactions and having an in-twin marketplace system. In embodiments, provided herein is a platform for integrating a set of gaming engines and a set of smart contract services in a common execution framework having a distributed ledger for recording electronic transactions and having a system for integrating with at least one hardware or software system to provide at least one of end-user or automated services.

In embodiments, provided herein is a platform for integrating a set of gaming engines and a set of smart contract services in a common execution framework having an AI-driven system for automatically configuring a smart contract. In embodiments, provided herein is a platform for integrating a set of gaming engines and a set of smart contract services in a common execution framework having an AI-driven system for automatically configuring a smart contract and having a machine learning and/or artificial intelligence system for detecting performance of a contract. In embodiments, provided herein is a platform for integrating a set of gaming engines and a set of smart contract services in a common execution framework having an AI-driven system for automatically configuring a smart contract and having a machine learning and/or artificial intelligence system configured to provide governance and compliance support. In embodiments, provided herein is a platform for integrating a set of gaming engines and a set of smart contract services in a common execution framework having an AI-driven system for automatically configuring a smart contract and having a machine learning and/or artificial intelligence system for categorizing transactions. In embodiments, provided herein is a platform for integrating a set of gaming engines and a set of smart contract services in a common execution framework having an AI-driven system for automatically configuring a smart contract and having intelligent agents for undertaking workflows related to smart contract configuration. In embodiments, provided herein is a platform for integrating a set of gaming engines and a set of smart contract services in a common execution framework having an AI-driven system for automatically configuring a smart contract and having intelligent agents for negotiating contract terms. In embodiments, provided herein is a platform for integrating a set of gaming engines and a set of smart contract services in a common execution framework having an AI-driven system for automatically configuring a smart contract and having intelligent agents for getting other agents. In embodiments, provided herein is a platform for integrating a set of gaming engines and a set of smart contract services in a common execution framework having an AI-driven system for automatically configuring a smart contract and having intelligent agents for recognizing a target. In embodiments, provided herein is a platform for integrating a set of gaming engines and a set of smart contract services in a common execution framework having an AI-driven system for automatically configuring a smart contract and having simulation systems. In embodiments, provided herein is a platform for integrating a set of gaming engines and a set of smart contract services in a common execution framework having an AI-driven system for automatically configuring a smart contract and having a fraud detection system. In embodiments, provided herein is a platform for integrating a set of gaming engines and a set of smart contract services in a common execution framework having an AI-driven system for automatically configuring a smart contract and having a configuration and management system. In embodiments, provided herein is a platform for integrating a set of gaming engines and a set of smart contract services in a common execution framework having an AI-driven system for automatically configuring a smart contract and having a digital twin and a digital twin user interface for user interaction with the digital twin. In embodiments, provided herein is a platform for integrating a set of gaming engines and a set of smart contract services in a common execution framework having an AI-driven system for automatically configuring a smart contract and having a marketing and/or advertising system. In embodiments, provided herein is a platform for integrating a set of gaming engines and a set of smart contract services in a common execution framework having an AI-driven system for automatically configuring a smart contract and having at least one of an augmented reality interface, a virtual reality interface, or a mixed reality interface for the digital twin system. In embodiments, provided herein is a platform for integrating a set of gaming engines and a set of smart contract services in a common execution framework having an AI-driven system for automatically configuring a smart contract and having an in-twin marketplace system. In embodiments, provided herein is a platform for integrating a set of gaming engines and a set of smart contract services in a common execution framework having an AI-driven system for automatically configuring a smart contract and having a system for integrating with at least one hardware or software system to provide at least one of end-user or automated services.

In embodiments, provided herein is a platform for integrating a set of gaming engines and a set of smart contract services in a common execution framework having a machine learning and/or artificial intelligence system for detecting performance of a contract. In embodiments, provided herein is a platform for integrating a set of gaming engines and a set of smart contract services in a common execution framework having a machine learning and/or artificial intelligence system for detecting performance of a contract and having a machine learning and/or artificial intelligence system configured to provide governance and compliance support. In embodiments, provided herein is a platform for integrating a set of gaming engines and a set of smart contract services in a common execution framework having a machine learning and/or artificial intelligence system for detecting performance of a contract and having a machine learning and/or artificial intelligence system for categorizing transactions. In embodiments, provided herein is a platform for integrating a set of gaming engines and a set of smart contract services in a common execution framework having a machine learning and/or artificial intelligence system for detecting performance of a contract and having intelligent agents for undertaking workflows related to smart contract configuration. In embodiments, provided herein is a platform for integrating a set of gaming engines and a set of smart contract services in a common execution framework having a machine learning and/or artificial intelligence system for detecting performance of a contract and having intelligent agents for negotiating contract terms. In embodiments, provided herein is a platform for integrating a set of gaming engines and a set of smart contract services in a common execution framework having a machine learning and/or artificial intelligence system for detecting performance of a contract and having intelligent agents for getting other agents. In embodiments, provided herein is a platform for integrating a set of gaming engines and a set of smart contract services in a common execution framework having a machine learning and/or artificial intelligence system for detecting performance of a contract and having intelligent agents for recognizing a target. In embodiments, provided herein is a platform for integrating a set of gaming engines and a set of smart contract services in a common execution framework having a machine learning and/or artificial intelligence system for detecting performance of a contract and having simulation systems. In embodiments, provided herein is a platform for integrating a set of gaming engines and a set of smart contract services in a common execution framework having a machine learning and/or artificial intelligence system for detecting performance of a contract and having a fraud detection system. In embodiments, provided herein is a platform for integrating a set of gaming engines and a set of smart contract services in a common execution framework having a machine learning and/or artificial intelligence system for detecting performance of a contract and having a configuration and management system. In embodiments, provided herein is a platform for integrating a set of gaming engines and a set of smart contract services in a common execution framework having a machine learning and/or artificial intelligence system for detecting performance of a contract and having a digital twin and a digital twin user interface for user interaction with the digital twin. In embodiments, provided herein is a platform for integrating a set of gaming engines and a set of smart contract services in a common execution framework having a machine learning and/or artificial intelligence system for detecting performance of a contract and having a marketing and/or advertising system. In embodiments, provided herein is a platform for integrating a set of gaming engines and a set of smart contract services in a common execution framework having a machine learning and/or artificial intelligence system for detecting performance of a contract and having at least one of an augmented reality interface, a virtual reality interface, or a mixed reality interface for the digital twin system. In embodiments, provided herein is a platform for integrating a set of gaming engines and a set of smart contract services in a common execution framework having a machine learning and/or artificial intelligence system for detecting performance of a contract and having an in-twin marketplace system. In embodiments, provided herein is a platform for integrating a set of gaming engines and a set of smart contract services in a common execution framework having a machine learning and/or artificial intelligence system for detecting performance of a contract and having a system for integrating with at least one hardware or software system to provide at least one of end-user or automated services.

In embodiments, provided herein is a platform for integrating a set of gaming engines and a set of smart contract services in a common execution framework having a machine learning and/or artificial intelligence system configured to provide governance and compliance support. In embodiments, provided herein is a platform for integrating a set of gaming engines and a set of smart contract services in a common execution framework having a machine learning and/or artificial intelligence system configured to provide governance and compliance support and having a machine learning and/or artificial intelligence system for categorizing transactions. In embodiments, provided herein is a platform for integrating a set of gaming engines and a set of smart contract services in a common execution framework having a machine learning and/or artificial intelligence system configured to provide governance and compliance support and having intelligent agents for undertaking workflows related to smart contract configuration. In embodiments, provided herein is a platform for integrating a set of gaming engines and a set of smart contract services in a common execution framework having a machine learning and/or artificial intelligence system configured to provide governance and compliance support and having intelligent agents for negotiating contract terms. In embodiments, provided herein is a platform for integrating a set of gaming engines and a set of smart contract services in a common execution framework having a machine learning and/or artificial intelligence system configured to provide governance and compliance support and having intelligent agents for getting other agents. In embodiments, provided herein is a platform for integrating a set of gaming engines and a set of smart contract services in a common execution framework having a machine learning and/or artificial intelligence system configured to provide governance and compliance support and having intelligent agents for recognizing a target. In embodiments, provided herein is a platform for integrating a set of gaming engines and a set of smart contract services in a common execution framework having a machine learning and/or artificial intelligence system configured to provide governance and compliance support and having simulation systems. In embodiments, provided herein is a platform for integrating a set of gaming engines and a set of smart contract services in a common execution framework having a machine learning and/or artificial intelligence system configured to provide governance and compliance support and having a fraud detection system. In embodiments, provided herein is a platform for integrating a set of gaming engines and a set of smart contract services in a common execution framework having a machine learning and/or artificial intelligence system configured to provide governance and compliance support and having a configuration and management system. In embodiments, provided herein is a platform for integrating a set of gaming engines and a set of smart contract services in a common execution framework having a machine learning and/or artificial intelligence system configured to provide governance and compliance support and having a digital twin and a digital twin user interface for user interaction with the digital twin. In embodiments, provided herein is a platform for integrating a set of gaming engines and a set of smart contract services in a common execution framework having a machine learning and/or artificial intelligence system configured to provide governance and compliance support and having a marketing and/or advertising system. In embodiments, provided herein is a platform for integrating a set of gaming engines and a set of smart contract services in a common execution framework having a machine learning and/or artificial intelligence system configured to provide governance and compliance support and having at least one of an augmented reality interface, a virtual reality interface, or a mixed reality interface for the digital twin system. In embodiments, provided herein is a platform for integrating a set of gaming engines and a set of smart contract services in a common execution framework having a machine learning and/or artificial intelligence system configured to provide governance and compliance support and having an in-twin marketplace system. In embodiments, provided herein is a platform for integrating a set of gaming engines and a set of smart contract services in a common execution framework having a machine learning and/or artificial intelligence system configured to provide governance and compliance support and having a system for integrating with at least one hardware or software system to provide at least one of end-user or automated services.

In embodiments, provided herein is a platform for integrating a set of gaming engines and a set of smart contract services in a common execution framework having a machine learning and/or artificial intelligence system for categorizing transactions. In embodiments, provided herein is a platform for integrating a set of gaming engines and a set of smart contract services in a common execution framework having a machine learning and/or artificial intelligence system for categorizing transactions and having intelligent agents for undertaking workflows related to smart contract configuration. In embodiments, provided herein is a platform for integrating a set of gaming engines and a set of smart contract services in a common execution framework having a machine learning and/or artificial intelligence system for categorizing transactions and having intelligent agents for negotiating contract terms. In embodiments, provided herein is a platform for integrating a set of gaming engines and a set of smart contract services in a common execution framework having a machine learning and/or artificial intelligence system for categorizing transactions and having intelligent agents for getting other agents. In embodiments, provided herein is a platform for integrating a set of gaming engines and a set of smart contract services in a common execution framework having a machine learning and/or artificial intelligence system for categorizing transactions and having intelligent agents for recognizing a target. In embodiments, provided herein is a platform for integrating a set of gaming engines and a set of smart contract services in a common execution framework having a machine learning and/or artificial intelligence system for categorizing transactions and having simulation systems. In embodiments, provided herein is a platform for integrating a set of gaming engines and a set of smart contract services in a common execution framework having a machine learning and/or artificial intelligence system for categorizing transactions and having a fraud detection system. In embodiments, provided herein is a platform for integrating a set of gaming engines and a set of smart contract services in a common execution framework having a machine learning and/or artificial intelligence system for categorizing transactions and having a configuration and management system. In embodiments, provided herein is a platform for integrating a set of gaming engines and a set of smart contract services in a common execution framework having a machine learning and/or artificial intelligence system for categorizing transactions and having a digital twin and a digital twin user interface for user interaction with the digital twin. In embodiments, provided herein is a platform for integrating a set of gaming engines and a set of smart contract services in a common execution framework having a machine learning and/or artificial intelligence system for categorizing transactions and having a marketing and/or advertising system. In embodiments, provided herein is a platform for integrating a set of gaming engines and a set of smart contract services in a common execution framework having a machine learning and/or artificial intelligence system for categorizing transactions and having at least one of an augmented reality interface, a virtual reality interface, or a mixed reality interface for the digital twin system. In embodiments, provided herein is a platform for integrating a set of gaming engines and a set of smart contract services in a common execution framework having a machine learning and/or artificial intelligence system for categorizing transactions and having an in-twin marketplace system. In embodiments, provided herein is a platform for integrating a set of gaming engines and a set of smart contract services in a common execution framework having a machine learning and/or artificial intelligence system for categorizing transactions and having a system for integrating with at least one hardware or software system to provide at least one of end-user or automated services.

In embodiments, provided herein is a platform for integrating a set of gaming engines and a set of smart contract services in a common execution framework having intelligent agents for undertaking workflows related to smart contract configuration. In embodiments, provided herein is a platform for integrating a set of gaming engines and a set of smart contract services in a common execution framework having intelligent agents for undertaking workflows related to smart contract configuration and having intelligent agents for negotiating contract terms. In embodiments, provided herein is a platform for integrating a set of gaming engines and a set of smart contract services in a common execution framework having intelligent agents for undertaking workflows related to smart contract configuration and having intelligent agents for getting other agents. In embodiments, provided herein is a platform for integrating a set of gaming engines and a set of smart contract services in a common execution framework having intelligent agents for undertaking workflows related to smart contract configuration and having intelligent agents for recognizing a target. In embodiments, provided herein is a platform for integrating a set of gaming engines and a set of smart contract services in a common execution framework having intelligent agents for undertaking workflows related to smart contract configuration and having simulation systems. In embodiments, provided herein is a platform for integrating a set of gaming engines and a set of smart contract services in a common execution framework having intelligent agents for undertaking workflows related to smart contract configuration and having a fraud detection system. In embodiments, provided herein is a platform for integrating a set of gaming engines and a set of smart contract services in a common execution framework having intelligent agents for undertaking workflows related to smart contract configuration and having a configuration and management system. In embodiments, provided herein is a platform for integrating a set of gaming engines and a set of smart contract services in a common execution framework having intelligent agents for undertaking workflows related to smart contract configuration and having a digital twin and a digital twin user interface for user interaction with the digital twin. In embodiments, provided herein is a platform for integrating a set of gaming engines and a set of smart contract services in a common execution framework having intelligent agents for undertaking workflows related to smart contract configuration and having a marketing and/or advertising system. In embodiments, provided herein is a platform for integrating a set of gaming engines and a set of smart contract services in a common execution framework having intelligent agents for undertaking workflows related to smart contract configuration and having at least one of an augmented reality interface, a virtual reality interface, or a mixed reality interface for the digital twin system. In embodiments, provided herein is a platform for integrating a set of gaming engines and a set of smart contract services in a common execution framework having intelligent agents for undertaking workflows related to smart contract configuration and having an in-twin marketplace system. In embodiments, provided herein is a platform for integrating a set of gaming engines and a set of smart contract services in a common execution framework having intelligent agents for undertaking workflows related to smart contract configuration and having a system for integrating with at least one hardware or software system to provide at least one of end-user or automated services.

In embodiments, provided herein is a platform for integrating a set of gaming engines and a set of smart contract services in a common execution framework having intelligent agents for negotiating contract terms. In embodiments, provided herein is a platform for integrating a set of gaming engines and a set of smart contract services in a common execution framework having intelligent agents for negotiating contract terms and having intelligent agents for getting other agents. In embodiments, provided herein is a platform for integrating a set of gaming engines and a set of smart contract services in a common execution framework having intelligent agents for negotiating contract terms and having intelligent agents for recognizing a target. In embodiments, provided herein is a platform for integrating a set of gaming engines and a set of smart contract services in a common execution framework having intelligent agents for negotiating contract terms and having simulation systems. In embodiments, provided herein is a platform for integrating a set of gaming engines and a set of smart contract services in a common execution framework having intelligent agents for negotiating contract terms and having a fraud detection system. In embodiments, provided herein is a platform for integrating a set of gaming engines and a set of smart contract services in a common execution framework having intelligent agents for negotiating contract terms and having a configuration and management system. In embodiments, provided herein is a platform for integrating a set of gaming engines and a set of smart contract services in a common execution framework having intelligent agents for negotiating contract terms and having a digital twin and a digital twin user interface for user interaction with the digital twin. In embodiments, provided herein is a platform for integrating a set of gaming engines and a set of smart contract services in a common execution framework having intelligent agents for negotiating contract terms and having a marketing and/or advertising system. In embodiments, provided herein is a platform for integrating a set of gaming engines and a set of smart contract services in a common execution framework having intelligent agents for negotiating contract terms and having at least one of an augmented reality interface, a virtual reality interface, or a mixed reality interface for the digital twin system. In embodiments, provided herein is a platform for integrating a set of gaming engines and a set of smart contract services in a common execution framework having intelligent agents for negotiating contract terms and having an in-twin marketplace system. In embodiments, provided herein is a platform for integrating a set of gaming engines and a set of smart contract services in a common execution framework having intelligent agents for negotiating contract terms and having a system for integrating with at least one hardware or software system to provide at least one of end-user or automated services.

In embodiments, provided herein is a platform for integrating a set of gaming engines and a set of smart contract services in a common execution framework having intelligent agents for getting other agents. In embodiments, provided herein is a platform for integrating a set of gaming engines and a set of smart contract services in a common execution framework having intelligent agents for getting other agents and having intelligent agents for recognizing a target. In embodiments, provided herein is a platform for integrating a set of gaming engines and a set of smart contract services in a common execution framework having intelligent agents for getting other agents and having simulation systems. In embodiments, provided herein is a platform for integrating a set of gaming engines and a set of smart contract services in a common execution framework having intelligent agents for getting other agents and having a fraud detection system. In embodiments, provided herein is a platform for integrating a set of gaming engines and a set of smart contract services in a common execution framework having intelligent agents for getting other agents and having a configuration and management system. In embodiments, provided herein is a platform for integrating a set of gaming engines and a set of smart contract services in a common execution framework having intelligent agents for getting other agents and having a digital twin and a digital twin user interface for user interaction with the digital twin. In embodiments, provided herein is a platform for integrating a set of gaming engines and a set of smart contract services in a common execution framework having intelligent agents for getting other agents and having a marketing and/or advertising system. In embodiments, provided herein is a platform for integrating a set of gaming engines and a set of smart contract services in a common execution framework having intelligent agents for getting other agents and having at least one of an augmented reality interface, a virtual reality interface, or a mixed reality interface for the digital twin system. In embodiments, provided herein is a platform for integrating a set of gaming engines and a set of smart contract services in a common execution framework having intelligent agents for getting other agents and having an in-twin marketplace system. In embodiments, provided herein is a platform for integrating a set of gaming engines and a set of smart contract services in a common execution framework having intelligent agents for getting other agents and having a system for integrating with at least one hardware or software system to provide at least one of end-user or automated services.

In embodiments, provided herein is a platform for integrating a set of gaming engines and a set of smart contract services in a common execution framework having intelligent agents for recognizing a target. In embodiments, provided herein is a platform for integrating a set of gaming engines and a set of smart contract services in a common execution framework having intelligent agents for recognizing a target and having simulation systems. In embodiments, provided herein is a platform for integrating a set of gaming engines and a set of smart contract services in a common execution framework having intelligent agents for recognizing a target and having a fraud detection system. In embodiments, provided herein is a platform for integrating a set of gaming engines and a set of smart contract services in a common execution framework having intelligent agents for recognizing a target and having a configuration and management system. In embodiments, provided herein is a platform for integrating a set of gaming engines and a set of smart contract services in a common execution framework having intelligent agents for recognizing a target and having a digital twin and a digital twin user interface for user interaction with the digital twin. In embodiments, provided herein is a platform for integrating a set of gaming engines and a set of smart contract services in a common execution framework having intelligent agents for recognizing a target and having a marketing and/or advertising system. In embodiments, provided herein is a platform for integrating a set of gaming engines and a set of smart contract services in a common execution framework having intelligent agents for recognizing a target and having at least one of an augmented reality interface, a virtual reality interface, or a mixed reality interface for the digital twin system. In embodiments, provided herein is a platform for integrating a set of gaming engines and a set of smart contract services in a common execution framework having intelligent agents for recognizing a target and having an in-twin marketplace system. In embodiments, provided herein is a platform for integrating a set of gaming engines and a set of smart contract services in a common execution framework having intelligent agents for recognizing a target and having a system for integrating with at least one hardware or software system to provide at least one of end-user or automated services.

In embodiments, provided herein is a platform for integrating a set of gaming engines and a set of smart contract services in a common execution framework having simulation systems. In embodiments, provided herein is a platform for integrating a set of gaming engines and a set of smart contract services in a common execution framework having simulation systems and having a fraud detection system. In embodiments, provided herein is a platform for integrating a set of gaming engines and a set of smart contract services in a common execution framework having simulation systems and having a configuration and management system. In embodiments, provided herein is a platform for integrating a set of gaming engines and a set of smart contract services in a common execution framework having simulation systems and having a digital twin and a digital twin user interface for user interaction with the digital twin. In embodiments, provided herein is a platform for integrating a set of gaming engines and a set of smart contract services in a common execution framework having simulation systems and having a marketing and/or advertising system. In embodiments, provided herein is a platform for integrating a set of gaming engines and a set of smart contract services in a common execution framework having simulation systems and having at least one of an augmented reality interface, a virtual reality interface, or a mixed reality interface for the digital twin system. In embodiments, provided herein is a platform for integrating a set of gaming engines and a set of smart contract services in a common execution framework having simulation systems and having an in-twin marketplace system. In embodiments, provided herein is a platform for integrating a set of gaming engines and a set of smart contract services in a common execution framework having simulation systems and having a system for integrating with at least one hardware or software system to provide at least one of end-user or automated services.

In embodiments, provided herein is a platform for integrating a set of gaming engines and a set of smart contract services in a common execution framework having a fraud detection system. In embodiments, provided herein is a platform for integrating a set of gaming engines and a set of smart contract services in a common execution framework having a fraud detection system and having a configuration and management system. In embodiments, provided herein is a platform for integrating a set of gaming engines and a set of smart contract services in a common execution framework having a fraud detection system and having a digital twin and a digital twin user interface for user interaction with the digital twin. In embodiments, provided herein is a platform for integrating a set of gaming engines and a set of smart contract services in a common execution framework having a fraud detection system and having a marketing and/or advertising system. In embodiments, provided herein is a platform for integrating a set of gaming engines and a set of smart contract services in a common execution framework having a fraud detection system and having at least one of an augmented reality interface, a virtual reality interface, or a mixed reality interface for the digital twin system. In embodiments, provided herein is a platform for integrating a set of gaming engines and a set of smart contract services in a common execution framework having a fraud detection system and having an in-twin marketplace system. In embodiments, provided herein is a platform for integrating a set of gaming engines and a set of smart contract services in a common execution framework having a fraud detection system and having a system for integrating with at least one hardware or software system to provide at least one of end-user or automated services.

In embodiments, provided herein is a platform for integrating a set of gaming engines and a set of smart contract services in a common execution framework having a configuration and management system. In embodiments, provided herein is a platform for integrating a set of gaming engines and a set of smart contract services in a common execution framework having a configuration and management system and having a digital twin and a digital twin user interface for user interaction with the digital twin. In embodiments, provided herein is a platform for integrating a set of gaming engines and a set of smart contract services in a common execution framework having a configuration and management system and having a marketing and/or advertising system. In embodiments, provided herein is a platform for integrating a set of gaming engines and a set of smart contract services in a common execution framework having a configuration and management system and having at least one of an augmented reality interface, a virtual reality interface, or a mixed reality interface for the digital twin system. In embodiments, provided herein is a platform for integrating a set of gaming engines and a set of smart contract services in a common execution framework having a configuration and management system and having an in-twin marketplace system. In embodiments, provided herein is a platform for integrating a set of gaming engines and a set of smart contract services in a common execution framework having a configuration and management system and having a system for integrating with at least one hardware or software system to provide at least one of end-user or automated services.

In embodiments, provided herein is a platform for integrating a set of gaming engines and a set of smart contract services in a common execution framework having a digital twin and a digital twin user interface for user interaction with the digital twin. In embodiments, provided herein is a platform for integrating a set of gaming engines and a set of smart contract services in a common execution framework having a digital twin and a digital twin user interface for user interaction with the digital twin and having a marketing and/or advertising system. In embodiments, provided herein is a platform for integrating a set of gaming engines and a set of smart contract services in a common execution framework having a digital twin and a digital twin user interface for user interaction with the digital twin and having at least one of an augmented reality interface, a virtual reality interface, or a mixed reality interface for the digital twin system. In embodiments, provided herein is a platform for integrating a set of gaming engines and a set of smart contract services in a common execution framework having a digital twin and a digital twin user interface for user interaction with the digital twin and having an in-twin marketplace system. In embodiments, provided herein is a platform for integrating a set of gaming engines and a set of smart contract services in a common execution framework having a digital twin and a digital twin user interface for user interaction with the digital twin and having a system for integrating with at least one hardware or software system to provide at least one of end-user or automated services.

In embodiments, provided herein is a platform for integrating a set of gaming engines and a set of smart contract services in a common execution framework having a marketing and/or advertising system. In embodiments, provided herein is a platform for integrating a set of gaming engines and a set of smart contract services in a common execution framework having a marketing and/or advertising system and having at least one of an augmented reality interface, a virtual reality interface, or a mixed reality interface for the digital twin system. In embodiments, provided herein is a platform for integrating a set of gaming engines and a set of smart contract services in a common execution framework having a marketing and/or advertising system and having an in-twin marketplace system. In embodiments, provided herein is a platform for integrating a set of gaming engines and a set of smart contract services in a common execution framework having a marketing and/or advertising system and having a system for integrating with at least one hardware or software system to provide at least one of end-user or automated services.

In embodiments, provided herein is a platform for integrating a set of gaming engines and a set of smart contract services in a common execution framework having a digital twin system having at least one of an augmented reality interface, a virtual reality interface, or a mixed reality interface for the digital twin system. In embodiments, provided herein is a platform for integrating a set of gaming engines and a set of smart contract services in a common execution framework having a digital twin system having at least one of an augmented reality interface, a virtual reality interface, or a mixed reality interface for the digital twin system and having an in-twin marketplace system. In embodiments, provided herein is a platform for integrating a set of gaming engines and a set of smart contract services in a common execution framework having a digital twin system having at least one of an augmented reality interface, a virtual reality interface, or a mixed reality interface for the digital twin system and having a system for integrating with at least one hardware or software system to provide at least one of end-user or automated services.

In embodiments, provided herein is a platform for integrating a set of gaming engines and a set of smart contract services in a common execution framework having an in-twin marketplace system. In embodiments, provided herein is a platform for integrating a set of gaming engines and a set of smart contract services in a common execution framework having an in-twin marketplace system and having a system for integrating with at least one hardware or software system to provide at least one of end-user or automated services.

In embodiments, provided herein is a platform for integrating a set of gaming engines and a set of smart contract services in a common execution framework having a system for integrating with at least one hardware or software system to provide at least one of end-user or automated services.

Additive Manufacturing Embodiments

"Additive manufacturing" refers to a collection of versatile fabrication techniques for rapid prototyping and/or manufacturing of parts that allow 3D digital models (CAD designs) to be converted to three dimensional objects by depositing multiple thin layers of material, such as according to a series of two-dimensional, cross-sectional deposition maps.

Accordingly, the term "additive manufacturing platform" used herein encompasses a platform that prints, builds, or otherwise produces 3D parts and/or products at least in part using an additive manufacturing technique. The additive manufacturing platform may encompass technologies like 3D printing, vapor deposition, polymer (or other material) coating, epitaxial and/or crystalline growth approaches, and others, alone or in combination with other technologies, such as subtractive or assembly technologies, and enables manufacturing of a three-dimensional product from a design via a process of forming successive layers of the product, with optional interim or subsequent steps to arrive at a finished component or system. The design may be in the form of a data source like an electronic 3D model created with a computer aided design package or via 3D scanner. The 3D printing or other additive process then involves forming a first material-layer and then adding successive material layers wherein each new material-layer is added on a pre-formed material-layer, until the entire designed three-dimensional product is completed. The additive manufacturing platform may be a stand-alone unit, a sub-unit of a larger system or production line, and/or may include other non-additive manufacturing features, such as subtractive-manufacturing features, pick-and-place features, coating features, finishing features (such as etching, lithography, painting, polishing and the like), two-dimensional printing features, and the like. Further, the platform may include three-dimensional additive manufacturing machines configured for rapid prototyping, three-dimensional printing, two-dimensional printing, freeform fabrication, solid freeform fabrication, and stereolithography; subtractive manufacturing machines including computer numerical controlled fabrication machines; injection molding machines; and the like.

FIG. 222 is a diagrammatic view illustrating an example environment of an autonomous additive manufacturing platform 22210 according to some embodiments of the present disclosure. The platform operates within a manufacturing node 22200, which in turn is a part of a larger network of transaction enablement platform entities. The manufacturing node 22200 includes an additive manufacturing unit 22202, such as a 3D printer for printing with metal materials, biocompatible materials, bioactive materials, biological materials, or other more conventional additive manufacturing materials, or other additive manufacturing type described herein, in the documents incorporated herein by reference, or as understood in the art. The manufacturing node 22200 may include, among other elements, a pre-processing system 22204, a post-processing system 22206, and a material handling system 22208. The autonomous additive manufacturing platform 22210 helps in automating and optimizing the digital production workflow leading to better outcomes at all stages of operation. A data processing and intelligence component 22218 of the autonomous additive manufacturing platform 22210 runs artificial intelligence systems, such as involving machine learning or other algorithms, neural networks, expert systems, models, and others, to process the input data and calculate an optimal set of process parameters for printing or other additive manufacturing. Process control component 22220 of the autonomous additive manufacturing platform 22210 then adjusts one or more process parameters in real time and the additive manufacturing unit 22202 uses these process parameters to complete the additive manufacturing process. In embodiments, finishing systems 22221 at the manufacturing node 22210, such as subtractive systems, assembly systems, additional processing systems, and the like may undertake further processing, optionally in iterative sequences with additive stages, resulting in a finished item (e.g., a part, component, or finished good). In embodiments, the resulting product is then optionally packaged at a packaging system 22222 and may be shipped, using a shipping system 22224 and one or more transaction enablement platform entities 22226, right up to an end customer. In other embodiments, the additive manufacturing platform 22210 and/or a set of additive manufacturing units 22202 may comprise portable or otherwise mobile units, such as handheld units, units equipped with robotic or other autonomous mobility, and/or units positioned in or on vehicles, including general purpose vehicles and special purpose vehicles. In such cases, actions from design through delivery may occur in parallel with mobility of the units 22202 and in coordination, by the additive manufacturing platform 22210, with the location and mobility of other transaction enablement platform entities 22226. In one of many possible examples, a set of autonomously mobile 3D printing units may be coordinated to points of service work, such as a set of home or business locations, where they may be configured to print tools, parts, or other items to support the service work, such as repairs or replacements. In embodiments, additive manufacturing, including design generation, design review, preprocessing, and printing steps, may commence while the unit 22202 is in transit to the point of service. In another example, a mobile autonomous additive manufacturing unit 22202 (either autonomous, semi-autonomous, or with an operator) and packaging unit may complete final steps of manufacturing in transit, such as by adding customization elements (e.g., a final coating of a selected color, a customer-specific design element, or the like) in transit and optionally completing final packaging in transit. In embodiments, one or more components of the additive manufacturing platform 22210 may be disposed in or integrated with a smart container or a smart package, as described elsewhere herein and in the documents incorporated by reference herein. In embodiments, a set of additive manufacturing units 22202 may be integrated into or with a set of robotic systems, such as mobile and/or autonomous robotic systems. For example, the additive manufacturing unit 22202 may be contained within the housing or body of a robotic system, such as a multi-purpose/general purpose robotic system, such as one that simulates human or other animal species capabilities. Alternatively, or additionally, the additive manufacturing unit 22202 may be configured to deliver additive layering from a nozzle that is disposed on an operating end of a robotic arm or other assembly. In embodiments, multiple additive manufacturing units 22202, or multiple nozzles, printheads or other working elements may be integrated with a single mobile, autonomous, and/or or multi-purpose robotic system, such as where one additive manufacturing unit 22202 is housed and prints/layers within the body of the robotic system (such as in a chamber, such as vacuum chamber, pressurized chamber, heated chamber, or the like) and another additive manufacturing unit 22202 prints/layers or otherwise operates upon an external site, such as a target location of a machine, product, or the like, such as by a nozzle, printhead, or the like that is disposed on an arm or similar element of the robot. In embodiments, multiple printing/layering elements are served by a common material source, such as of thermoplastic material. In embodiments, multiple material sources are available for internal and external printing/layering elements. In embodiments, an internal printing element operates within a chamber using materials that require control over the printing environment or operates on high-value production elements, such as parts that are intended for long-term use, such as metal manufactured parts. In embodiments, the external working unit uses materials or does jobs that require other materials and/or have other purposes, such as production of disposable tools, grips, supports, fasteners and the like in support of a job, such as a repair or replacement job, among many others. In embodiments, the external printing/layering unit is combined with a robotic arc welding unit, such as to provide, in series or parallel, a set of printing/layering steps and a series of arc welding steps to undertake a job on an external site, workpiece, or the like. In embodiments, an assembly may be provided to encapsulate and/or shield an external working unit, such as a temporary chamber, balloon, tent, or other volume that isolates the area where the nozzle, printhead, or the like will print, layer, or the like, optionally also encapsulating or shielding a workpiece or target location for printing/layering within the same shielded/isolated space as the additive manufacturing element. In embodiments, the encapsulated/shielded area may be sealed to allow pressurization, depressurization, vacuum creation, introduction of materials for deposition, and the like. In embodiments, the encapsulation/shielding may use an additively manufactured element or combination thereof with another element. In embodiments, an AI system 22312 may automate one or more of the design, configuration, scheduling, coordination and/or execution of a set of robotic jobs, and a set of additive manufacturing jobs, such that the capabilities of an integrated mobile robotic and additive manufacturing unit are coordinated across the various jobs in time (e.g., where an interior 3D printer or other additive manufacturing unit 22202 prints a tool, workpiece, part or the like for a later job while the robotic unit performs a current job) and/or wherein jobs are coordinated across a fleet or workforce of robotic units, additive manufacturing units, and integrated combinations thereof (such as where units are matched to jobs according to locations, robotic capabilities, additive manufacturing capabilities, and other factors).

In embodiments, material handling systems 22208 provide storage, movement, control, and handling of materials through the process of manufacturing and distribution. For example, the material handling systems 22208 may feed, orient, load/unload, or otherwise manipulate metal materials, biocompatible materials, bioactive materials, biological materials, or other more conventional additive manufacturing materials in the manufacturing space. In embodiments, the material handling systems 22208 may be semi or fully automated and may include one or more robotic units for material handling.

In embodiments, the material handling systems 22208 may include or integrate with, optionally in the same housing, unit or system, a material capture and processing system 22227 for capturing material (such as recapturing unused material from jobs and/or capturing available material from a work site, such as from used, broken, or defective items) and rendering the material suitable to use as a source material, such as by: (a) automatically analyzing an item to determine its compatibility for use as source material (e.g., by identifying it as a given type of metal, alloy, polymer or plastic, such as by machine vision, chemical testing, image-based testing, weighing the item, or the like); (b) cleaning, filtering, disassembling, or otherwise pre-processing the item or material, such as to remove non-conforming material; (c) rendering a solid item or material into a thermoplastic state, such as by controlled heating, such as according to a material-specific heating profile; (d) filtering or otherwise treating the material, such as to remove defects; (e) storing the item in an appropriate vessel or form factor for later use, with appropriate reporting of capacity and availability, such as to a broader system for managing jobs, including cooling and/or otherwise processing the material into a wire, powder, mesh, rod, filament, or the like until the need for a job arises; (f) delivering the item for additive manufacturing operation; and/or (g) reporting on measures of recapture and savings, including material cost savings, savings on recycling costs, and/or time savings. For example, in embodiments, a broken part may be melted down onsite and reprinted. For example, in embodiments, a material that would otherwise be disposed of or recycled may be rendered useful on site, without the need for reverse logistics. In embodiments, a common heating source is used, with alternate points of heating at different temperatures, to render recaptured material into a thermoplastic state and for preparing material for additive manufacturing operations.

The manufacturing node 22200 may also connect to other nodes like a manufacturing node 22228 through connectivity facilities so as to constitute a distributed manufacturing network 22230. Also, the different systems within the manufacturing node 22200 including the additive manufacturing unit 22202, the pre-processing system 22204, the post-processing system 22206, the material handling system 22208, the autonomous additive manufacturing platform 22210, the user interface 22212, the data sources 22214, and the design and simulation system 22216 as well as the different parts and products being printed may be referred to as distributed manufacturing network entities.

In embodiments, connectivity facilities include various connectivity facilities described throughout this disclosure and the documents incorporated by reference herein, including network connections (including various configurations, types, and protocols for fixed and wireless connections), Internet of Things devices, edge devices, routers, switches, access points, repeaters, mesh networking systems, interfaces, ports, application programming interfaces (APIs), brokers, services, connectors, wired or wireless communication links, human-accessible interfaces, software interfaces, micro-services, SaaS interfaces, PaaS interfaces, IaaS interfaces, cloud capabilities, or the like by which data or information may be exchanged between systems or subsystems of the autonomous additive manufacturing platform 22210, as well as with other systems, such as distributed manufacturing network entities or external systems, such as cloud-based or on-premises enterprise systems (e.g., accounting systems, resource management systems, CRM systems, and many others). In embodiments, connectivity facilities use, include, or are integrated with artificial intelligence or autonomous capabilities as described herein and/or in the documents incorporated herein by reference, such as enabling self-organization or self-configuration of connectivity, data storage, computation, data processing, packet routing, data filtering, quality-of-service, error correction, packet security, session management, and the like. In embodiments, the additive manufacturing unit 22202 may incorporate a wireless mesh network node, such as an RF repeater, optionally using software-defined bandpass filtering, such that a set of such additive manufacturing units 22202 may operate as a coordinated mesh on a defined network infrastructure (including physical and/or virtual network resources). In embodiments, the additive manufacturing unit 22202 may include network coding system for controlling the utilization of a data path between the additive manufacturing unit 22202 and other additive manufacturing units 22202 and/or to control the utilization of the data path between the additive manufacturing unit 22202 and various edge, cloud, on-premises, telecommunications network, and other information technology systems.

The additive manufacturing unit 22202 may be any suitable type of printer that executes any suitable type of 3D printing process or any other type of unit that executes another additive manufacturing process. Various different types of additive manufacturing units 22202 and 3D printing processes are discussed below for purposes of example. The disclosure, however, is not limited to the 3D printing processes described below.

In embodiments, the additive manufacturing unit 22202 may be configured to execute Fused Deposition Modeling (FDM)™ process (also known as, for example, Fused Filament Fabrication™). The process of FDM may involve a software process which may process an input file, such as an STL (stereolithography) file. An object may be produced by extruding small beads of, for example, thermoplastic material to form layers as the material hardens immediately after extrusion from a nozzle. Extrusion is the 3D printing technique where the material, such as a polymer, metal (including alloys), or the like, is pushed in fluid form through a tube and into a moving nozzle which extrudes the material to a target location where the material subsequently hardens in place. By accurately moving the extruder either continuously or starting and stopping at extremely fast speeds, the design is built layer by layer. The source material is typically supplied and stored in solid form, such as in a filament or wire that is wound in a coil and then unwound to supply material to a heating element to render the material into a thermoplastic state and an extrusion nozzle which can control the flow of the material between an "off" state and a maximal flow state. A worm-drive, or any other suitable drive system, may be provided to push the filament into the nozzle at a controlled rate. The nozzle is heated to melt the material. The thermoplastic materials are heated past their state transition temperature (from solid to fluid) and are then deposited by an extrusion head. The nozzle can be moved in both horizontal and vertical directions, such as by a numerically controlled mechanism. In embodiments, the nozzle may follow a tool-path that is controlled by a computer-aided manufacturing (CAM) software package, and the object is fabricated layer-by-layer, such as from the bottom up.

In embodiments, the additive manufacturing unit 22202 may include multiple source materials and multiple extrusion nozzles (and supporting components for the same, such as for movement and positioning), such as to allow (a) rapid switching between source materials, such as facilitated by a valve set, such as a high-pressure valve set, and/or (b) simultaneous extrusion by multiple nozzles, such as to enable simultaneous layering at different points of work on an item. In embodiments, the additive manufacturing unit 22202 enables voxelated soft matter printing and/or metal printing via multi-material, multi-nozzle printing, with high-speed switching between materials, e.g., at speeds of 50 times per second or faster.

In embodiments, the additive manufacturing unit 22202 may be configured to execute an electron beam freeform fabrication (EBFFF) process. The EBFFF process may utilize electron beam welding technology to create metallic parts. In embodiments, with the EBFFF method, metallic preforms can be manufactured from computer-generated 3D drawings or models. The deposition path and process parameters may be generated from post-processing of a virtual 3D model and executed by a real-time computer control. The deposition takes place in a vacuum environment. A wire may be directed toward the molten pool and melted by a focused electronic beam. Different parts of the object to be fabricated are built up layer by layer by moving the electronic beam and wire source across a surface of underlying material referred to as a substrate. The deposit solidifies immediately after the electron beam has passed.

In embodiments, the additive manufacturing unit 22202 may be configured to execute a direct metal laser sintering process (DMLS). The DMLS process may involve a laser as a power source to sinter powdered material such as a metal at points in space defined by a 3D model, thus binding the material together to create a solid structure. The DMLS process may involve the use of a 3D CAD model whereby a file, such as an .stl file, is created and sent to the software of the additive manufacturing unit 22202. The DMLS-based 3D printer may use a high-powered fiber optic laser. The metal powder is fused into a solid part by melting it locally using the focused laser beam. Object parts are built up additively layer by layer.

In embodiments, the additive manufacturing unit 22202 may be configured to execute a selective laser melting (SLM) process. The SLM process uses 3D CAD data as a digital information source and energy in the form of a high-power laser beam to create 3D metal parts by fusing fine metallic powders together. The process involves slicing of the 3D CAD file data into layers to create a 2D image of each layer. Thin layers of atomized fine metal powder are evenly distributed using a coating mechanism onto a substrate plate that is fastened to an indexing table that moves in the vertical (Z) axis. This takes place inside a chamber containing a tightly controlled atmosphere of inert gas such as argon. Once each layer has been distributed, each 2D slice of the geometry is fused by selectively applying the laser energy to the powder surface by directing the focused laser beam using two high frequency scanning mirrors in the X- and Y-axes. The laser energy permits full melting of the particles to form solid metal. The process is repeated layer after layer until the part is complete. In embodiments, the SLM process may be a multi-scanner and/or multi-laser SLM process, such as enabling simultaneous action across multiple scans and/or multiple target points of laser melting work.

In embodiments, the additive manufacturing unit 22202 may be configured to execute a selective heat sintering process. The process may involve a thermal printhead to apply heat to layers of powdered source material to render it to a thermoplastic state. When a layer is finished, the powder bed of source material moves down, and an automated roller adds a new layer of material, which is sintered to form the next cross-section of the object. Power bed printing may refer to a technique where one or more powders, typically a metal powder, are connected via various methods such as lasers or heat in order to rapidly produce the end product. Typically, it is done by either having an area filled with powder and only connecting the design areas of the powder while layer by layer removing the rest or by adding powder layer-by-layer while simultaneously connecting it. Similar to light polymerization, powder bed printing is significantly faster than other types of 3D printing. In embodiments, the additive manufacturing unit 22202 may employ multiple powder bed/roller subsystems, thereby enabling simultaneous work on different target points of work and/or multi-material powder bed applications that allow switching between materials.

In embodiments, the additive manufacturing unit 22202, of various types described herein, may combine materials to produce an output comprising a composite of materials, such as to combine favorable properties (e.g., mechanical properties) of two materials to provide benefits that surpass those of a single material. In embodiments, composite materials produced in or by the additive manufacturing units 22202 may comprise functionally graded materials (FGMs), such as where two materials are joined with a graded interface that avoids a distinct boundary between the materials. This may distribute thermal and/or mechanical stresses that result from different material properties over a larger volume/space, thereby mitigating issues like cracking and breaking that occur with non-graded composite materials.

In embodiments, the additive manufacturing unit 22202 may be configured to execute a selective laser sintering process. The process of selective laser sintering (SLS) involves a laser used to melt a flame-retardant plastic powder, which then solidifies to form the printed layer. In embodiments, the additive manufacturing unit 22202 may be configured to execute a plaster-based 3D printing process. In embodiments, the additive manufacturing unit 22202 may be configured to execute a laminated object manufacturing process. In this process, layers of adhesive-coated paper, plastic, or metal laminates may be successively glued together and cut to shape with a knife or laser cutter. After the object is fabricated by the additive manufacturing unit 22202, additional modifications may be done by machining or drilling after printing. In embodiments, the selective laser sintering (SLS) involves multiple lasers, thereby allowing for switching and/or simultaneous work on different target locations and/or different material types.

In embodiments, the additive manufacturing unit 22202 may be configured to execute stereo-lithography (SLA) processes. The process may employ a resin, such as from a vat of liquid ultraviolet curable photopolymer material, and an ultraviolet laser to build layers one at a time. For each layer, the laser beam traces a cross-section of the part pattern on the surface of the liquid resin. Exposure to the ultraviolet laser light cures and solidifies the pattern traced on the resin and joins it to the layer below. In embodiments, the SLA process may involve multiple UV lasers, allowing for switching and/or simultaneous work on different target locations and/or different material types.

In embodiments, the additive manufacturing unit 22202 may be configured to execute digital light processing (DLP) methods. Digital light processing uses a projector to project an image of a cross-section of an object into a vat of photopolymer (light reactive plastic). The light selectively hardens only the area specified in that image. A printed layer is then repositioned to leave room for unhardened photopolymer to fill the newly created space between the print and the projector. Repeating this process builds up the object one layer at a time. In embodiments, multiple DLP sources deliver light to different locations, allowing for switching and/or simultaneous work on different target locations within the light reactive plastic material.

In embodiments, the additive manufacturing unit 22202 may be configured to execute light polymerization methods. In this process, drops of a liquid plastic are exposed to a laser beam of ultraviolet light. During this exposure, light converts the liquid into a solid. Light polymerization may employ a technique where a rising or falling layer of light-sensitive polymer is subjected to the type of light which causes it to harden in changing areas over time as it rises or falls and/or a technique where a moving (e.g., laser) light source is targeted to different locations where liquid polymer/plastic material is positioned. This causes these areas of the polymer to harden, and once the desired shape is created, the remaining liquid polymer that did not harden is removed, leaving the finished product. Light polymerization is useful because of how fast the final product completes, with some types working up to a hundred times faster, or more, than other 3D printing methods for some designs.

In embodiments, the additive manufacturing unit 22202 may involve the use of an inkjet type printhead to deliver a liquid or colloidal binder material to layers of a powdered build material. The printing technique may involve applying a layer of a powdered build material to a surface, such as using a roller. After the build material is applied to the surface, the printhead delivers the liquid binder to predetermined areas of the layer of material. The binder infiltrates the material and reacts with the powder, causing the layer to solidify in the printed areas by, for example, activating an adhesive in the powder. After the first cross-sectional portion is formed, the steps are repeated, and successive cross-sectional portions are fabricated until the final product is formed.

In embodiments, the methods performed by the additive manufacturing unit 22202 may involve deposition of successive layers of a build material on a rotary build table and deposition of a liquid in a predetermined pattern on each successive layer of the build material to form a 3D object.

In embodiments, the additive manufacturing unit 22202 may incorporate multiple types of additive manufacturing capabilities among those described herein or understood by those with skill in the art, thereby forming a hybrid additive manufacturing unit. In embodiments, hybrid additive manufacturing units may further integrate other manufacturing capabilities, such as subtractive techniques, assembly systems, handling systems, finishing systems, and the like. In embodiments, a hybrid additive manufacturing unit may integrate injection delivery of a colloidal binder material with a liquid polymerization technique.

In embodiments, the platform 22210 may provide 3D printed products that conform to a body part/anatomy of the user including wearables like eyewear, footwear, earwear, and headgear. Conformance may, in embodiments, be based on a scan of a body part or anatomical feature, such as a laser or other structured light scan, a MRI, EEG, computed tomography, ultrasound or other imaging scan, or the like. A 3D topology for the anatomical feature may be used as an input source for generation by a CAD system or other design system (which may be linked to or integrated into an additive manufacturing platform) of a design for additive manufacturing. The design may be configured to produce an anatomy-compatible item that conforms well to anatomy (such as a hearable unit that fits the inner ear, headgear that fits the head, a brace that fits a joint, or the like) and/or an item that is intended to replace a part of the anatomy, such as a prosthetic.

In embodiments, the platform 22210 has the capability to self-start and self-power.

In embodiments, the platform 22210 has a built-in recycling capability wherein scrap parts may be automatically returned to the production process and support materials and excess powders may be returned to the production process.

FIG. 223 is a schematic illustrating an example implementation of the autonomous additive manufacturing platform for automating and optimizing the digital production workflow for additive manufacturing (e.g., metal manufacturing) according to some embodiments of the present disclosure.

The autonomous additive manufacturing platform 22210 includes a data collection and management system 22302, a data storage system 22304, and a data processing system 22306.

The data collection and management system 22302 collects and organizes data collected from various data sources including real time data collected from a set of sensors. Some examples of sensors providing data as input to the data collection and management system 22302 include a power and energy sensor, mass sensor, location sensor, temperature sensor, humidity sensor, pressure sensor, viscosity sensor, flow sensor, chemical/gas sensor, strain gauge to measure, image capture/camera, video capture, thermal imaging, hyperspectral imaging, sound sensor, and air quality sensor.

The data storage system 22304 may store a wide range of data types using various storage media, data architecture, and formats including but not limited to: entity or asset data (such as part profile, product profile, printer profile), state data (such as indicating a state, condition status, or other indicator with respect to any asset, entity, application, components or elements of the platform 22210), user data (including identity data, role data, task data, workflow data, health data, performance data, quality data and many other types), event data (such as with respect to any of a wide range of events, including operational data, transactional data, workflow data, maintenance data, and many other types of data that includes or relates to events that occur within the platform 22210 or with respect to one or more applications, including process events, financial events, transaction events, output events, input events, state-change events, operating events, workflow events, repair events, maintenance events, service events, damage events, replacement events, refueling events, recharging events, shipping events, supply chain events, and many others); claims data (such as data relating to product liability, general liability, injury, and other liability claims and claims data relating to contracts, such as supply contract performance claims, product delivery requirements, warranty claims, indemnification claims, delivery requirements, timing requirements, milestones, key performance indicators, and others); accounting data (such as data relating to completion of contract requirements, satisfaction of bonds, payment of duties and tariffs, and others); and risk management data (such as relating to parts or products supplied, amounts, pricing, delivery, sources, routes, customs information, and many others), among many other data types associated with the platform 22210.

In embodiments, the data storage system 22304 may store data in a distributed ledger, digital thread, or the like, such as for maintaining a serial or other record of an entity or asset over time, including a part or products or any other asset or entity described herein.

The data processing system 22306 includes an artificial intelligence system 22312, such as a machine learning system 22310. The machine learning system 22310 may define a machine learning model 22313 for performing analytics, simulation, decision making, and predictive analytics related to data processing, data analysis, simulation creation, and/or simulation analysis of one or more of assets or entities of the distributed manufacturing network 22230 of FIG. 222. In embodiments, the platform 22210 may include a set of artificial intelligence systems 22312 (including any of the types described herein or in the documents incorporated herein by reference) that are configured (a) to operate on a set of inputs and/or a set of optimization factors to automatically select a suitable type of additive manufacturing for a design/job; (b) to automatically discover a set of available additive manufacturing units 22202 (optionally including single-type units and/or hybrid type units), (c) to automatically select a set of units 22202 to perform an additive manufacturing job; (d) to automatically schedule a set of additive manufacturing units 22202 to perform a set of additive manufacturing jobs; (e) to automatically configure a selected set of additive manufacturing units 22202 to undertake a set of additive manufacturing jobs using a set of designs provided by the set of artificial intelligence system; and/or (f) to automatically configure logistics and delivery of a set of outputs from a set of additive manufacturing units. In embodiments, the set of inputs may include locations and types of available additive manufacturing units 22202, current job schedules for additive manufacturing units, cost factors (such as material costs, energy costs, costs of IT resources, costs of labor, pricing for additive manufacturing services, and others), design inputs (such as functional requirements regarding strength, flexibility, resilience, temperature tolerance, strain tolerance, resistance to wear, water resistance, stress tolerance, weight bearing, tensile strength, load bearing, and many others), as well as compatibility factors (including shape compatibility, biocompatibility, chemical compatibility, environmental compatibility, and others). Optimization factors may include aesthetic factors, compatibility factors (as noted above), economic factors (such as marginal cost, total cost, profitability, price, brand impact, and others), timing factors (such as for coordination with workflows and activities, including various ongoing manufacturing, service, maintenance, marketing, delivery and/or logistics processes), prioritization factors, and many others. In embodiments, the artificial intelligence system of the platform 22210 is trained based on a training set of data that includes expert interactions with a set of additive manufacturing projects that involve various types of additive manufacturing options. In embodiments, the AI system is trained based on outcome factors, such as product quality and/or product defect outcomes, economic outcomes, on-time completion outcomes, and the like, such as involving deep learning, supervised learning, and/or semi-supervised learning. In embodiments, the AI system is distributed between the additive manufacturing units 22202 and a host system, such as a cloud-based system. In embodiments, the AI system is integrated into the additive manufacturing unit 22202. In embodiments, the AI system is distributed across a set of additive manufacturing units 22202, such as a mesh or network of additive manufacturing unit 22202 nodes, such that the above capabilities are coordinated across the units, such as by self-configuration of the units 22202 in coordination with other units, such as a fleet of additive manufacturing units 22202 owned by an enterprise and/or co-operated and/or shared by a set of users (such as in an "additive manufacturing as a service" system). As one example among many possible examples, the AI system of the platform 22210 may take a set of design requirements, such as functional requirements, generate a set of designs that satisfy the functional requirements, determine the optimal combination of additive manufacturing types to produce each set of designs, find and compare available additive manufacturing units for each combination (such as using economic factors and other factors), and select, configure, and schedule units to undertake the design. For example, among many possibilities across a wide range of product categories, the AI system may take functional requirements for a customized wearable device for a latex-allergic individual user that meets a design requirement of using biocompatible, waterproof materials, while being capable of withstanding impacts and bending, in a color that matches the customers exact preference from a large palette of colors. The AI system may automatically generate an instruction set for producing the wearable device using a combination/hybrid of light polymerization (operating on a non-latex polymer) for components of the wearable that will touch the user and a DMLS process for interior metal/alloy components. The AI system may then find available units, such as different units or an integrated/hybrid unit, schedule the units to undertake jobs (e.g., to fit a targeted delivery time), configure the units, send the jobs, and schedule delivery. Thus, the AI system may automatically manage the design, generation, and delivery, through use of a set of additive manufacturing units, of a highly customized product based on customer specific design requirements, including health requirements, physical configuration requirements, economic factors, and preferences, among many others.

In embodiments, the machine learning model 22313 is an algorithm and/or statistical model that performs specific tasks without using explicit instructions, relying instead on patterns and inference. The machine learning model 22313 may build one or more mathematical models based on training data to make predictions and/or decisions without being explicitly programmed to perform the specific tasks. The machine learning model 22313 may receive inputs of sensor data or other data as training data, including event data and state data related to one or more of the entities or assets, or other inputs noted above or throughout this disclosure. The sensor data input to the machine learning model 22313 may be used to train the machine learning model 22313 to perform the analytics, simulation, decision making, and/or predictive analytics relating to the data processing, data analysis, simulation creation, and/or simulation analysis of the one or more of the distributed manufacturing network entities or assets. The machine learning model 22313 may also use input data from a user or users of the autonomous additive manufacturing platform 22210. In embodiments, the machine learning model 22313 may use the input data and sensor data to determine an optimal set of process parameters for 3D printing of a part by the additive manufacturing unit 22202. The machine learning model 22313 may include an artificial neural network, a decision tree, a logistic regression model, a stochastic gradient descent model, a fuzzy classifier, a support vector machine, a Bayesian network, a hierarchical clustering algorithm, a k-means algorithm, a genetic algorithm, any other suitable form of machine learning model, or a combination thereof. The machine learning model 22313 may be configured to learn through supervised learning, unsupervised learning, reinforcement learning, self-learning, feature learning, sparse dictionary learning, anomaly detection, association rules, a combination thereof, or any other suitable algorithm for learning.

In embodiments, the artificial intelligence system 22312 may define a digital twin system 22316 to create a digital replica or digital twin of one or more of the distributed manufacturing network entities. The digital twin of the one or more of the distributed manufacturing network entities may use substantially real-time sensor data to provide for substantially real-time virtual representation of the distributed manufacturing network entities and for simulation of one or more possible future states of the one or more distributed manufacturing network entities. The digital twin exists simultaneously with the one or more distributed manufacturing network entities being replicated (physical twin) and may be updated continuously based on sensor data, test and inspection results, conducted maintenance, modifications etc. to reflect the current condition or parameter values of the one or more distributed manufacturing network entities. The digital twin provides one or more simulations of both physical elements and characteristics of the one or more distributed manufacturing network entities being replicated and the dynamics thereof, in embodiments, throughout the lifecycle of the one or more distributed manufacturing network entities being replicated. The digital twin may provide a hypothetical simulation of the one or more distributed manufacturing network entities, for example, during a design phase before the one or more entities are manufactured or fabricated or during or after construction or fabrication of the one or more entities by allowing for hypothetical extrapolation of sensor data to simulate a state of the one or more distributed manufacturing network entities, such as during high stress, after a period of time has passed during which component wear may be an issue, during maximum throughput operation, after one or more hypothetical or planned improvements have been made to the one or more distributed manufacturing network entities, or any other suitable hypothetical situation. In embodiments, the machine learning model 22313 may automatically predict hypothetical situations for simulation with the digital twin, such as by predicting possible improvements to the one or more distributed manufacturing network entities, predicting when one or more components of the one or more distributed manufacturing network entities may fail, and/or suggesting possible improvements to the one or more distributed manufacturing network entities, such as changes to parameters, arrangements, components, or any other suitable change to the distributed manufacturing network entities.

The digital twin allows for simulation of the one or more distributed manufacturing network entities during both design and operation phases of the one or more distributed manufacturing network entities, as well as simulation of hypothetical operation conditions and configurations of the one or more distributed manufacturing network entities. The digital twin allows for analysis and simulation of the one or more distributed manufacturing network entities by facilitating observation and measurement of nearly any type of metric, including temperature, pressure, wear, light, humidity, deformation, expansion, contraction, deflection, bending, stress, strain, load-bearing, shrinkage, in, on, and around each of the one or more distributed manufacturing network entities. The insights gained from analysis and simulation using digital twins may be passed onto the design or manufacturing processes for improvement of these processes.

In embodiments, the machine learning model 22313 may process the sensor data, including the event data and the state data, to define simulation data for use by the digital twin system 22314. The machine learning model 22313 may, for example, receive state data and event data related to a particular distributed manufacturing network entity and perform a series of operations on the state data and the event data to format the state data and the event data into a format suitable for use by the digital twin system 22314 in creation of a digital replica of the distributed manufacturing network entity. For example, one or more distributed manufacturing network entities may include a product being manufactured by the additive manufacturing unit 22202. The machine learning model may collect data from one or more sensors positioned on, near, in, and around the product. The machine learning model may perform operations on the sensor data to process the sensor data into simulation data and output the simulation data to the digital twin system 22314. The digital twin system 22314 may use the simulation data to create one or more product twins 22315, the simulation including, for example, metrics including temperature, wear, speed, rotation, and vibration of the product and parts thereof. The simulation may be a substantially real-time simulation, allowing for a user of the platform 22210 to view the simulation of the product, metrics related thereto, and metrics related to parts thereof, in substantially real time. The simulation may be a predictive or hypothetical situation, allowing for a user of the platform 22210 to view a predictive or hypothetical simulation of the product, metrics related thereto, and metrics related to components thereof.

In embodiments, the machine learning model 22313 and the digital twin system 22314 may process sensor data and create a digital twin of a set of distributed manufacturing network entities to facilitate design, real-time simulation, predictive simulation, and/or hypothetical simulation of a related group of distributed manufacturing network entities.

In embodiments, a control system 22316 in the data processing system 22306 may adjust process parameters of the 3D printing process in real-time based on the simulations.

In embodiments, a distributed manufacturing network entity, such as the additive manufacturing unit 22202 or the platform 22210, may, optionally automatically, generate a set of digital twins of a set of manufactured items, such as products, components, parts, or the like. In embodiment, the digital twin of a manufactured item generated by the additive manufacturing unit 22202 or the platform 22210 may include, link to, be enriched by, and/or integrate with, among other things: (a) an instruction set according to which an item was additively manufactured, such as including shape information, material layering information, functional information, operational parameter information (such as described elsewhere herein), and the like; (b) a training data set based upon data which an artificial intelligence system was trained in connection with the design or manufacturing of the item; (c) a sensor data set, such as containing time series sensor data (such as imaging data from various imaging systems) indicating exact conditions of manufacturing of the item, such as linking a series of images of layers of the item as it was generated with data indicating, in case with respect to the item, the environment in which it was manufactured, the equipment or tools used, the materials used, and/or the like, the sensor data set may relate to temperatures, pressures, fluid flow rates, heat flux data, volume data, topological data, radiation data (e.g., intensity of lasers, visible light, infrared light, UV, x-rays, magnetic fields, electrical fields and the like), chemical information (e.g., presence of reactants, catalysts, and the like), biological data (e.g., presence and states of biomaterials, pathogens, and other factors), and others; (d) a testing data set, such as indicating outcomes of testing before, during, or after manufacturing, such as equipment testing, material testing, stress testing, visual inspection (including by machine vision), strain testing, torsion testing, load testing, impact testing, operational testing, and the like; (e) manufacturing information relating to similar items, such as outcomes of manufacturing, usage, or the like; and others. In embodiments, the additive manufacturing unit 22202 may automatically create the digital twin upon receiving an instruction to manufacture an item and subsequently enrich and/or modify the digital twin during manufacturing and/or after manufacturing. In embodiments, the additive manufacturing unit 22202 may automatically embed the above-referenced data for the digital twin of the item in or on the item (such as by writing to a data structure that is embedded in or disposed on the item, such as chip), on a tag for the item, on a container or package, or the like.

FIG. 224 is a block diagram illustrating the information flow in the autonomous additive manufacturing platform 22210 for optimization of different operational parameters of the additive manufacturing process according to some embodiments of the present disclosure. In embodiments, the parameters may be associated with a 3D printed part, a 3D printed product, a 3D printing process, or a 3D printing machine. Some examples for parameters include: extrusion temperature, rate of material deposition, tool path, voltage settings of heating apparatus, exposure pattern, layer height, printing surface temperature, layer height/thickness, build speed, build material flow rate, part orientation, air gap, shape and volume information for holes, spaces, voids, lumens, gaps, conduits and the like, support structure settings, ambient conditions including temperature, humidity and pressure, raw material conditions including temperature and viscosity, part conditions including temperature, stress concentrations including compressive, tensile, shear, bending and torsional stresses, and the like. Again, the parameters are typically specific to a given additive manufacturing technique, material, geometry and application, or particular hybrid or combination thereof.

Referring to FIG. 224, at 22400, input data for the printing of a product is received at the autonomous additive manufacturing platform 22210. The input data may be received at a user interface of platform 22210 and can include details like 3D printing technique, geometry and key features of the product, and printing material etc. In embodiments, the input data may just include the required properties (like strength, stiffness, yield, elasticity, elongation, electrical conductivity, thermal conductivity etc.) or areas of application (aerospace, dental, automotive, jewelry, etc.) of the product, and the platform 22210 may determine details like 3D printing technique or material to be used for printing. This may occur automatically (such as by artificial intelligence), or with human interaction and/or supervision, such as where a set of recommended details are suggested by AI and confirmed and/or modified by a human user.

At 22402, an instruction set for additive manufacturing, such as a profile, such as a 3D print profile, is determined based on the input received at 22400, as well as simulation received from the machine learning system 22310 and the digital twin system 22314. The profile includes parameters for additive manufacturing of the product, such as using the 3D printer.

At 22404, sensor data (including but not limited to ambient, product or material temperatures; compressive, shear, tensile, bending and torsional stresses; oxygen, carbon dioxide level, and ozone levels; humidity; vibration; sound signature and visual indicators) from the additive manufacturing (e.g., 3D printing) process is collected. The data collection and management system 22302 helps collect the sensor data through an array of sensors and other data collecting technologies like IoT devices, machine vision systems, and the like. The collected data may be analyzed at the edge devices or sent to one or more data pools within the data storage system 22304, such as for later consumption by local or remote intelligence. The use of cloud-connectable edge devices, such as within computing infrastructure that is proximal to the additive manufacturing unit(s) 22202 (such as in a local area network of a building, campus, or other premises where the additive manufacturing unit(s) 22202 are located and/or in a connected vehicle that transports the additive manufacturing unit(s) 22202) and/or that is integrated with or into the additive manufacturing unit 22202, such as where the additive manufacturing unit 22202 has onboard edge computational and/or connectivity resources, such as 5G (or other cellular), Wifi, Bluetooth, fixed networking resources, or the like), offers opportunities to provide rapid, real time or near real time processing responsiveness while benefiting from the expansive computing and data storage capabilities provided by highly scalable cloud computing resources, such as servers and the like.

In embodiments, data may also be stored in a blockchain, such as one where storage is distributed across multiple manufacturing nodes as well as other data storage devices or systems. In embodiments, this may take the form of a distributed ledger that may capture transactions, events, or the like, such as financial events involving additive manufacturing, smart contract-related events, operational events (such as scheduling or completion of jobs), and others. The data may also be multiplexed or otherwise condensed using sensor fusion and relayed over a network and fed into the machine learning system employing one or more machine learning models.

At 22406, the parameters may be dynamically adjusted as needed based on the analysis of sensor data. As the 3D printing is complete, the data related to the outcome of the 3D printing process is collected at 22408. The outcome data may be collected through a user interface wherein a user provides information regarding the success or failure of the 3D print. The data is then provided as feedback to the machine learning system 22310, which uses the feedback to train or improve the initial machine learning model (such as improvements by adjusting weights, rules, parameters, or the like, based on the feedback). In embodiments, the feedback is utilized to analyze trends over multiple 3D prints performed by one or more users across multiple additive manufacturing units 22202 and manufacturing nodes 22200.

In embodiments, the autonomous additive manufacturing platform 22210 provides optimization and process control across the entire lifecycle of manufacturing using machine learning, from product conception and design through manufacturing and distribution to service and maintenance.

In embodiments, the autonomous additive manufacturing platform 22210 provides for generative design and topology optimization to determine at least one product design suitable for fabrication.

In embodiments, the autonomous additive manufacturing platform 22210 provides for optimization of a build preparation process.

In embodiments, the autonomous additive manufacturing platform 22210 optimizes part orientation process for superior production results.

In embodiments, the autonomous additive manufacturing platform 22210 automatically determines and recommends support structures to minimize material costs, print time, post processing, and risk of damage to the 3D printed part (on support removal).

In embodiments, the autonomous additive manufacturing platform 22210 provides for optimizing toolpath generation. For example, in a 3D printer, a toolpath may comprise the trajectory of the nozzle and/or print head. In embodiments, toolpath generation enables a manufacturing process to fill the boundary and interior areas of each sliced layer. Various types of toolpath strategies and algorithms, such as zigzag, contour, spiral, and partition patterns, are possible with considerations on the build time, cost, geometrical quality, warpage, shrinkage, strength, and stiffness of a manufacturing model. In embodiments, an artificial intelligence system may be trained on outcomes, such as described above, to provide a recommended toolpath and/or to entirely automate toolpath generation.

In embodiments, the autonomous additive manufacturing platform 22210 provides for optimized dynamic 2D, 2.5D, and 3D nesting to maximize the number of printed parts while minimizing the raw material waste. In embodiments, nesting is optimized such that the nesting algorithm evaluates individual part priority to ensure high priority parts are handled accordingly, such as with scheduling priority, priority in quality, priority in ease-of-use, priority of positioning, or the like. In embodiments, nesting is optimized such that the nesting algorithm minimizes the travel time for the cutting tool. In embodiments, nesting is optimized such that the nesting algorithm integrates with support structure optimization.

In embodiments, the autonomous additive manufacturing platform 22210 provides for optimization of post processing processes.

In embodiments, the autonomous additive manufacturing platform 22210 provides for an automated powder removal system utilizing a digital twin wherein the digital twin calculates the optimal movement of the powder removal system while de-powdering.

In embodiments, the autonomous additive manufacturing platform 22210 provides for an automated, hands-free support structure removal.

In embodiments, the autonomous additive manufacturing platform 22210 provides for automated surface finishing.

In embodiments, the autonomous additive manufacturing platform 22210 provides for automated part metrology for use with integrated quality and process control systems.

In embodiments, manufacturing methods described herein may use material additives during processing that impart various characteristics in finished parts. Examples in plastic injection molding include glass fiber for added strength, and electrically conductive and shielding fibers for tailored electrical properties. For some applications, orientation of added fibers or other materials may affect the performance of finished parts. For example, in a glass fiber reinforcement application, long fiber orientation may dictate minimum and maximum deformation orientations under stress. Fiber orientation during manufacturing may be only partially controlled through mold design, injection nozzle location and pressure, and other process controls.

3D printed parts may also be manufactured using material additives; however, most 3D printing methods can only produce materials with limited ability to optimize additive characteristics such as fiber orientation to help optimize finished part performance. For example, 3D printers may use nozzles that extrude various plastic materials, but inherent flow characteristics of a fixed nozzle, and limitations of the 3D printing process in general, limit options for finished part material engineering. Such use of 3D printing nozzles offer the ability to control orientation of additive materials as they are laid down for part production. This development provides the opportunity to finely tailor material performance, for example, localized orientations for structural enhancement or homogeneous random orientation for electrical shielding performance. In examples, this capability may be provided by a 3D printing nozzle that uses actuated flexible elements to change the shape of the nozzle during material application, resulting in predictable fiber orientations. This may be used in conjunction with other printing process parameters such as nozzle orientation, flow rate and pressure, and the like to further refine material characteristics. Use case examples include, but are not limited to: one or more engineering characteristics that may vary across a single part to provide targeted performance, for example, varying stiffness; optimized use of materials based on enhanced process control, for example, using less material to produce a part with the same functional performance; and providing control of multiple additives to impart combined capabilities, for example, orientation of structural long fibers for structural performance, combined with randomized conductive additives for a specified electrical performance.

Neural Networks for Artificial Intelligence Systems

Some embodiments of the present disclosure, including ones involving artificial intelligence, machine learning, automation (including robotic process automation, remote control, autonomous operation, automated configuration, and the like), expert systems, self-organization, adaptive intelligent systems for prediction, classification, optimization, and the like, may benefit from the use of a neural network, such as a neural network trained for pattern recognition, for classification of one or more parameters, characteristics, or phenomena, for support of autonomous control, and other purposes.

Neural networks (or artificial neural networks) are a family of statistical learning models inspired by biological neural networks and are used to estimate or approximate functions that may depend on a large number of inputs and are generally unknown. Neural networks represent a system of interconnected “neurons” which send messages to each other. The connections have numeric weights that can be tuned based on experience, making neural nets adaptive to inputs and capable of learning.

References to artificial intelligence, neural networks, or neural net throughout this disclosure should be understood to encompass a wide range of different types of machine learning systems, neural networks, such as feed forward neural networks, convolutional neural networks (CNN), recurrent neural networks (RNN), long short-term memory (LSTM) neural networks, gated recurrent unit (GRU) neural networks, self-organizing map (SOM) neural networks (e.g., Kohonen self-organizing neural networks), autoencoder (AE) neural networks, encoder-decoder neural networks, modular neural networks, or variations, hybrids or combinations of the foregoing, or combinations with reinforcement learning (RL) systems or other expert systems, such as rule-based systems, and model-based systems (including ones based on physical models, statistical models, flow-based models, biological models, biomimetic models, and the like).

The foregoing neural networks may have a variety of nodes or neurons, which may perform a variety of functions on inputs, such as inputs received from sensors or other data sources, including other nodes to predict one or more outputs. Functions may involve weights, features, feature vectors, and the like. Neurons may include perceptrons, neurons that mimic biological functions (such as the human senses of touch, vision, taste, hearing, and smell), and the like. Neural networks can employ multiple layers of operations including one or more hidden layers situated between an input layer and an output layer. The output of each layer can be used as input to another layer, e.g., the next hidden layer or the output layer. The output of a particular neuron can be a weighted sum of the inputs to the neuron, adjusted with a bias and multiplied by an activation function, e.g., a rectified linear unit (ReLU) or a sigmoid function.

In many embodiments, an expert system or neural network may be trained, such as by a human operator or supervisor, or based on a data set, model, or the like. Training a neural network can involve providing inputs to the untrained neural network to generate predicted outputs, comparing the predicted outputs to expected outputs, and updating the algorithm's weights and biases to account for the difference between the predicted outputs and the expected outputs. Specifically, a cost function can be used to calculate a difference between the predicted outputs and the expected outputs. By computing the derivative of the cost function with respect to the weights and biases of the network, the weights and biases can be iteratively adjusted over multiple cycles to minimize the cost function. Training may be complete when the predicted outputs satisfy a convergence condition, e.g., a small magnitude of calculated cost as determined by the cost function.

Training may include presenting the neural network with one or more training data sets that represent values (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more environments and transmitted to the cloud platform over one or more networks, including using network coding to provide efficient transmission. In the cloud platform, optionally using massively parallel computational capability, a plurality of different neural networks of various types (including modular forms, structure-adaptive forms, hybrids, and the like) may be used to undertake prediction, classification, and control functions and provide other outputs as described in connection with expert systems disclosed throughout this disclosure. The different neural networks may be structured to compete with each other (optionally including use of evolutionary algorithms, genetic algorithms, or the like), such that an appropriate type of neural network, with appropriate input sets, weights, node types and functions, and the like, may be selected, such as by an expert system, for a specific task involved in a given context, workflow, environment process system, or the like.

In embodiments, methods and systems described herein that involve an expert system or self-organization capability may use a feed forward neural network, which moves information in one direction, such as from a data input, like a source of data about an individual, through a series of neurons or nodes, to an output. Data may move from the input nodes to the output nodes, optionally passing through one or more hidden nodes, without loops. In embodiments, feed forward neural networks may be constructed with various types of units, such as binary McCulloch-Pitts neurons, the simplest of which is a perceptron.

Example Embodiment for Part Classification and Defect Classification Using Neural Networks In embodiments, artificial intelligence and machine learning systems in the data processing system of the autonomous additive manufacturing platform may enable automatic classification and clustering of 3D printed parts and products. In embodiments, artificial intelligence and machine learning systems in the data processing system of the autonomous additive manufacturing platform may enable automatic classification and clustering of malicious defects in the additive manufacturing process.

The automated part and defect classification methods and systems of the present disclosure may be implemented using image sensors and/or machine vision systems. The machine vision systems may monitor the additive manufacturing process in real time, such as by capturing and analyzing images of the part or other item being printed. Automated image processing of the captured images may then be used to monitor any of a variety of part properties, e.g., dimensions (overall dimensions, or dimensions of specific features), feature angles, feature areas, surface finish (e.g., degree of light reflectivity, number of pits, and/or scratches per unit area), and the like. The machine vision systems also track the process to detect any defects or errors in the printed part in real time while successive layers of materials are being deposited by the 3D printer.

Defects may be identified, e.g., by removing noise from the inspection data and subtracting a reference data set (e.g., a reference image of a defect-free part in the case that machine vision tools are being utilized for inspection), and classified using an unsupervised machine learning algorithm such as cluster analysis or an artificial neural network, to classify individual objects as either meeting or failing to meet a specified set of decision criteria (e.g., a decision boundary) in the feature space in which defects are being monitored. For example, a partially printed part may be compared with a render of the partial part and, in case the partial part differs beyond a selected threshold from the render, the part may be classified as defective.

In embodiments, in-process, the defect classification data may be used by the machine learning algorithm to determine a set or sequence of process control parameter adjustments that will implement a corrective action, e.g., to adjust a layer dimension or thickness, so as to correct a defect when first detected. In some embodiments, in-process automated defect classification may be used by the machine learning algorithm to send a warning or error signal to an operator, or optionally, to automatically abort the deposition process.

In embodiments, the machine vision system uses a variable focus liquid lens-based camera for image capture and defect detection. In embodiments, the machine vision system uses infrared or visible wavelength cameras.

FIG. 225A is a diagrammatic view illustrating an example implementation of a data processing system using a neural network to provide real-time, adaptive control of an additive manufacturing process including part defect classification and feedback according to some embodiments of the present disclosure.

Neural networks generally comprise an interconnected group of nodes organized into multiple layers of nodes. For example, the neural network architecture may comprise at least an input layer, one or more hidden layers, and an output layer with each layer comprising a plurality of nodes or neurons that respond to different combinations of inputs from the previous layers. The input for the input layer is received directly from sensors and image or part defect data, whereas the hidden layers use output of nodes in previous layers as their input. The connections between the neurons have numeric weights that determine how much relative effect an input has on the output value of the node in question. The neural network may comprise any total number of layers and any number of hidden layers, where the hidden layers function as trainable feature extractors that allow mapping of a set of input data to a preferred output value or set of output values. The output layer provides a determination of a predicted future build state, and the neural network model is trained to predict future build state based on current build state and a set of actions.

Referring to FIG. 4, the input layer comprises one or more real-time streams of process/product property data that provide an indication of the current state of the manufacturing process and/or the product being fabricated. Examples of suitable input data streams include, but are not limited to, process simulation data, process monitoring or characterization data, in-process inspection data, post-build inspection data, or any combination thereof, as well as a list of process control parameters that may be adjusted to implement next step actions to achieve a target (or future) fabrication state.

This data is fed to a neural network 22500, which in many cases has been previously trained using one or more training data sets comprising process simulation data, process monitoring or characterization data, in-process inspection data, post-build inspection data, or any combination thereof, from previous fabrication runs of the same or different types of parts.

The input layer may include a plurality of input nodes 22502, 22504, 22506, 22508 and 22510 that may provide input data (e.g., sensor data, image data, defect data, audio data, etc.) to the neural network 22200. The input data may be from different sources and may include library data x1, simulation data x2, user input data x3, training data x4, and outcome data x5.

The input nodes 22502, 22504, 22506 22508 and 22510 may pass on the information to the next layer, and no computation may be performed by the input nodes. Hidden layer(s) may include a plurality of nodes, such as nodes 22512, 22514, and 22516, that may process the information from the input layer based on the weights of the connections between the input layer and the hidden layer and transfer information to the output layer. The output layer may include an output node 22518, which processes information based on the weights of the connections between the hidden layer and the output layer and is responsible for computing and transferring information from the network to the outside world, such as optimizing a process parameter, classifying certain parts or defects, or predicting a condition or an action.

In embodiments, the neural network 22500 may include two or more hidden layers and may be referred to as a deep neural network. In embodiments, the layers may be constructed so that the first layer detects a set of primitive patterns in the input (e.g. image) data, the second layer detects patterns of patterns, and the third layer detects patterns of those patterns.

In embodiments, a node in the neural network 22500 may have connections to all nodes in the immediately preceding layer and the immediate next layer. Thus, the layers may be referred to as fully connected layers.

In embodiments, a node in the neural network 22500 may have connections to only some of the nodes in the immediately preceding layer and the immediate next layer. Thus, the layers may be referred to as sparsely connected layers.

Each neuron in the neural network consists of a weighted combination (e.g., linear combination) of its inputs, and the computation on each neural network layer may be described as a multiplication of an input matrix and a weight matrix. A bias matrix may then be added to the resulting product matrix to account for the threshold of each neuron in the next level. Further, an activation function may be applied to each resultant value, and the resulting values may be placed in the matrix for the next layer. Thus, the output from a node i in the neural network may be represented as:

$$y_i=f(\Sigma x_i w_i+b_i)$$

where f is the activation function, $\Sigma x_i w_i$ is the weighted sum of input matrix, and bi is the bias matrix.

The activation function determines the activity level or excitation level generated in the node as a result of an input signal of a particular size. The purpose of the activation function is to introduce non-linearity into the output of a neural network node because most real-world functions are non-linear, and it is desirable that the neurons can learn these non-linear representations. Several activation functions may be used in an artificial neural network. One example activation function is the sigmoid function σ(x), which is a continuous S-shaped monotonically increasing function that asymptotically approaches fixed values as the input approaches plus or minus infinity. The sigmoid function σ(x) takes a real-valued input and transforms it into a value between 0 and 1:

$$\sigma(x)=1/(1+\exp(-x)).$$

Another example activation function is the tanh function, which takes a real-valued input and transforms it into a value within the range of [−1, 1]:

$$\tan h(x)=2\sigma(2x)-1$$

A third example activation function is the rectified linear unit (ReLU) function. The ReLU function takes a real-valued input and thresholds it above zero (i.e., replacing negative values with zero):

$$f(x)=\max(0,x).$$

In the example shown in FIG. 4, nodes 22502, 22504, 22506, 22508, and 22510 in the input layer may take external inputs x1, x2, x3, x4, and x5, which may be numerical values depending upon the input dataset. It will be understood that even though only five inputs are shown in FIG. 4, in various implementations, a node may include tens, hundreds, thousands, or more inputs. As discussed above, no computation is performed on input layer, and thus the outputs from nodes 22502, 22504, 22506, 22508, and 22510 of input layer are x1, x2, x3, x4, and x5 respectively, which are fed into the hidden layer. The output of node 22512 in the hidden layer may depend on the outputs from input layer (x1, x2, x3, x4, and x5) and weights associated with connections (w1, w2, w3, w4, and w5). Thus, the output from node 22512 may be computed as:

$$Y_{412}=f(x1w1+x2w2+x3w3+x4w4+x5w5+b_{412})$$

The outputs from the nodes 22514 and 22516 in the hidden layer may also be computed in a similar manner and then be fed to the node 22518 in the output layer. Node 22518 in the output layer may perform similar computations (using weights v1, v2, and v3 associated with the connections) as the nodes 22512, 22514, and 22516 in the hidden layers.

$$Y_{418}=f(y_{412}v1+y_{414}v2+y_{416}v3+b_{418})$$

Where $Y_{418}$ is the output of the neural network 22500.

Training

As mentioned, the connections between nodes in the neural network have associated weights. Weights determine how much relative effect an input value has on the output value of the node in question. Before the network is trained, random values are selected for each of the weights. The weights are adjusted during the training process, and this adjustment of weights to determine the best set of weights that maximize the accuracy of the neural network is referred to as training. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

In embodiments, backpropagation (e.g., backward propagation of errors) is utilized with an optimization method, such as gradient descent, to adjust weights and update the neural network characteristics. Backpropagation may be a supervised training scheme that learns from labeled training data and errors at the nodes by changing parameters of the neural network to reduce the errors. For example, a result of forward propagation (e.g., output activation value(s)) determined using training input data is compared against a corresponding known reference output data to calculate a loss function gradient. The gradient may be then utilized in an optimization method to determine new updated weights in an attempt to minimize a loss function. For example, to measure error, the mean square error is determined using the equation:

$$E=(\text{target}-\text{output})^2$$

To determine the gradient for a weight "w," a partial derivative of the error with respect to the weight may be determined, where:

$$\text{gradient}=\partial E/\partial w$$

The calculation of the partial derivative of the errors with respect to the weights may flow backwards through the node levels of the neural network. Then, a portion (e.g., ratio, percentage, etc.) of the gradient is subtracted from the weight to determine the updated weight. The portion may be specified as a learning rate "a." Thus, an example equation of determining the updated weight is given by the formula:

$$w\ \text{new}=w\ \text{old}-\alpha\partial E/\partial w$$

The learning rate must be selected such that it is not too small (e.g., a rate that is too small may lead to a slow convergence to the desired weights) and not too large (e.g., a rate that is too large may cause the weights to not converge to the desired weights). After the weight adjustment, the network should perform better than before for the same input because the weights have now been adjusted to minimize the errors.

In some embodiments, a neural network model may be used directly to determine adjustments to process control parameters using training or learning of a neural network model. Initially, the model is allowed to choose randomly from a range of values for each input process control parameter or action. If the sequence of process control parameter adjustments or actions leads to a flaw or defect, it is scored as leading to an undesirable (or negative) outcome. Repetition of the process using different sets of randomly chosen values for each process control parameter or action leads to reinforcement of those sequences that leads to desirable (or positive) outcomes. Ultimately, the neural network model "learns" what adjustments to make to a set or sequence of deposition process control parameters or actions in order to achieve the target outcome, i.e., a defect-free printed part.

In embodiments, methods and systems described herein may use a convolutional neural network (referred to in some cases as a CNN, a ConvNet, a shift invariant neural network, or a space invariant neural network), wherein the units are connected in a pattern similar to the visual cortex of the human brain.

FIG. 225B is a diagrammatic view illustrating an example implementation of a data processing system using a convolutional neural network (CNN) to provide automatic classification and clustering of parts and defects in an additive manufacturing process according to some embodiments of the present disclosure.

A convolutional neural network (CNN) is a specialized neural network for processing data having a known, grid-like topology, such as image data. Accordingly, CNNs are commonly used for classification, object recognition, and machine vision applications, but they also may be used for other types of pattern recognition such as speech and language processing.

A convolutional neural network learns highly non-linear mappings by interconnecting layers of artificial neurons arranged in many different layers with activation functions that make the layers dependent. It includes one or more convolutional layers, interspersed with one or more sub-sampling layers and non-linear layers, which are typically followed by one or more fully connected layers.

Referring to FIG. 4, a CNN includes an input layer with an input image 22520 to be classified by the CNN, a hidden layer which in turn includes one or more convolutional layers, interspersed with one or more activation or non-linear layers (e.g., ReLU) and pooling or sub-sampling layers, and an output layer typically including one or more fully connected layers. The input image 22520 may be represented by a matrix of pixels and may have multiple channels. For example, a colored image may have a red, a green, and a blue channel each representing red, green, and blue (RGB) components of the input image. Each channel may be represented by a 2-D matrix of pixels having pixel values in the range of, for example, 0 to 22355. A gray-scale image, on the other hand, may have only one channel. The following section describes processing of a single image channel. It will be understood that multiple channels may be processed in a similar manner.

As shown, the input image 22520 may be processed by the hidden layer, which includes sets of convolutional and activation layers 22522 and 22526, each followed by pooling layers 22524 and 22528.

The convolutional layers of the convolutional neural network serve as feature extractors capable of learning and decomposing the input image into hierarchical features. The convolution layers may perform convolution operations on the input image where a filter (also referred as a kernel or feature detector) may slide over the input image at a certain step size (referred to as the stride). For every position (or step), element-wise multiplications between the filter matrix and the overlapped matrix in the input image may be calculated and summed to get a final value that represents a single element of an output matrix constituting a feature map. The feature map refers to image data that represents various features of the input image data and may have smaller dimensions as compared to the input image. The activation or non-linear layers use different non-linear trigger functions to signal distinct identification of likely features on each hidden layer. Non-linear layers use a variety of specific functions to implement the non-linear triggering, including the rectified linear units (ReLUs), hyperbolic tangent, absolute of hyperbolic tangent, and sigmoid functions. In one implementation, a ReLU activation implements the function y=max(x, 0) and keeps the input and output sizes of a layer the same. The advantage of using ReLU is that the convolutional neural network is trained many times faster. ReLU is a non-continuous, non-saturating activation function that is linear with respect to the input if the input values are larger than zero and zero otherwise.

As shown in FIG. 225B, the first convolution and activation layer 22522 may perform convolutions on the input image 22520 using multiple filters followed by a non-linearity operation (e.g., ReLU) to generate multiple output matrices (or feature maps) 22530. The number of filters used may be referred to as the depth of the convolution layer. Thus, the first convolution and activation layer 22522 in the example of FIG. 4 has a depth of three and generates three feature maps using three filters. Feature maps 22530 may then be passed to the first pooling layer 22524 that may sub-sample or down-sample the feature maps using a pooling function to generate an output matrix 22532. The pooling function replaces the feature map with a summary statistic to reduce the spatial dimensions of the extracted feature map thereby reducing the number of parameters and computations in the network. Thus, the pooling layer reduces the dimensionality of the feature maps while retaining the most important information. The pooling function can also be used to introduce translation invariance into the neural network, such that small translations to the input do not change the pooled outputs. Different pooling functions may be used in the pooling layer, including max pooling, average pooling, and 12-norm pooling.

The output matrix 22532 may then be processed by a second convolution and an activation layer 22526 to perform convolutions and non-linear activation operations (e.g., ReLU) as described above to generate feature maps 22534. In the example shown in FIG. 4, a second convolution and the activation layer 22526 may have a depth of five. The feature maps 22534 may then be passed to a pooling layer 22528, where the feature maps 22534 may be subsampled or down-sampled to generate an output matrix 22536.

The output matrix 22536 generated by the pooling layer 22528 is then processed by one or more fully connected layer 22538 that forms a part of the output layer. The fully connected layer 22538 has a full connection with all the feature maps of the output matrix 22536 of the pooling layer 22528. In embodiments, the fully connected layer 22538 may take the output matrix 22536 generated by the pooling layer 22528 as the input in vector form and perform high-level determination to output a feature vector containing information of the structures in the input image 22520. In embodiments, the fully connected layer 22538 may classify the object in input image 22520 into one of several categories, such as using a softmax function. In embodiments, the softmax function may be used as the activation function in the output layer and may take a vector of real-valued scores and map it to a vector of values between zero and one that sum to one. In embodiments, other classifiers, such as a support vector machine (SVM) classifier, may be used.

In embodiments, one or more normalization layers may be added to the CNN to normalize the output of the convolution filters. The normalization layer may provide whitening or lateral inhibition, avoid vanishing or exploding gradients, stabilize training, and enable learning with higher rates and faster convergence. In embodiments, the normalization layers are added after the convolution layer, but before the activation layer.

A CNN may thus be seen as multiple sets of convolution, activation, pooling, normalization, and fully connected layers stacked together to learn, enhance, and extract implicit features and patterns in the input image 22302. A layer, as used herein, can refer to one or more components that operate with similar function by mathematical or other functional means to process received inputs to generate/derive outputs for a next layer with one or more other components for further processing within the CNN.

The initial layers of the CNN, e.g., convolution layers, may extract low level features such as edges and/or gradients from the input image 22520. Subsequent layers may extract or detect progressively more complex features and patterns such as presence of curvatures and textures in image data and so on. The output of each layer may serve as an input of a succeeding layer in the CNN to learn hierarchical feature representations from data in the input image 22520. This allows convolutional neural networks to efficiently learn increasingly complex and abstract visual concepts.

Although only two convolution layers are shown in the example, the present disclosure is not limited to the example architecture, and the CNN architecture may comprise any number of layers in total, and any number of layers for convolution, activation and pooling. In embodiments, a convolutional neural network may be deployed with a large number of neurons (e.g., 100,000, 500,000 or more), with multiple (e.g., 10, 50, 100 or more) layers, and with thousands of parameters.

For example, there have been many variations and improvements over the basic CNN model described above. Some examples include Alexnet, GoogLeNet, VGGNet (that stacks many layers containing narrow convolutional layers followed by max pooling layers), Residual network or ResNet (that uses residual blocks and skip connections to learn residual mapping), DenseNet (that connects each layer of CNN to every other layer in a feed-forward fashion), Squeeze and excitation networks (that incorporate global context into features), and AmobeaNet (that uses evolutionary algorithms to search and find optimal architecture for image recognition).

Training of Convolutional Neural Network

The training process of a convolutional neural network may be similar to the training process discussed in FIG. 225A with respect to the neural network 22500.

First, all parameters and weights (including the weights in the filters and weights for the fully connected layer) may be assigned, such as randomly assigned. Then, during training, a set of training image or images (in the case of CNNs used for object recognition) in which the objects have been detected and classified is provided as the input to the CNN, which performs the forward propagation steps. In other words, the CNN applies convolution, non-linear activation, and pooling layers to each training image to determine the classification vectors (i.e., to detect and classify each training image). These classification vectors are compared with the predetermined classification vectors. The error (e.g., the squared sum of differences, log loss, softmax log loss) between the classification vectors of the CNN and the predetermined classification vectors is determined. This error is then employed to update the weights and parameters of the CNN in a backpropagation process which may use gradient descent and may include one or more iterations. The training process is repeated for each training image in the training set.

The training process and inference process described above may be performed on hardware, software, or a combination of hardware and software. However, training a convolutional neural network or using the trained CNN for inference generally requires a significant amount of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for training and/or inference. Training and inference may be performed on a cloud, on a data center, or on a device.

In embodiments, one or more models building on the basic framework of convolutional neural networks may be employed. For example, an object detection model may be used that extends the functionality of CNN based image classification models by not only classifying parts or defects, but also determining their locations in an image in terms of bounding boxes. Similarly, Region-based CNN (R-CNN)

models may be used to extract regions of interest (ROI), where each ROI is a rectangle that may represent the boundary of a part in image.

In embodiments, Capsule Networks may be employed to use fewer labeled training examples to achieve similar classification performance of CNNs.

In embodiments, transformer-based, encoder-decoder architectures using attention mechanisms may be used in conjunction with or in place of convolutional neural networks.

FIG. 226 is a schematic view illustrating a system for learning on data from the platform 22210 to train the artificial learning system to use digital twins for classification, predictions, and decision-making according to some embodiments of the present disclosure.

Referring to FIG. 226, the digital twins 22314 in the autonomous additive platform may include product twins 22315, part twins 22604, printer twin 22606, user twin 22608, manufacturing node twin 22610, packager twin 22612, and the like that allow for modeling, simulation, prediction, decision-making, and classification. The digital twins 22314 may be populated with relevant data, for example, the product twins 22602 may be populated with data related to corresponding product including dimension data, material data, feature data, thermal data, price data, and the like.

In embodiments, a digital twin may be generated from other digital twins. For example, the product twin 22315 may be generated using one or more part twins 22604. In another example, the part twins 22604 may be generated using the product twins 22315. In embodiments, a digital twin may be embedded in another digital twin. For example, the part digital twin 22604 may be embedded in the product digital twin 22315 which may be embedded in the manufacturing node digital twin 22610.

In embodiments, a simulation management system 22614 may set up, provision, configure, and otherwise manage interactions and simulations between and among digital twins 22314.

In embodiments, the artificial intelligence system 22312 is configured to execute simulations in a simulation management system 22614 using the part twins 22602 and/or other digital twins available to the digital twin system 22314. For example, the artificial intelligent system 22312 may adjust one or more features of the printer twin 22606 as a set of part twins 22604 are printed by the 3D printer. In embodiments, the artificial intelligent system 22312 may, for each set of features, execute a simulation based on the set of features and may collect the simulation outcome data resulting from the simulation. For example, in executing a simulation on the set of part twins 22604 being manufactured in the printer twin 22606, the artificial intelligent system 22312 can vary the properties of the printer twin 22606 and can execute simulations that generate outcomes. During the simulation, the artificial intelligent system 22312 may vary the ambient temperature, pressure, humidity, lighting, and/or any other properties of the printer twin 22606. In this example, an outcome can be a condition of the part twin 22604 after being subjected to a high temperature. The outcomes from simulations can be used to train the machine learning models 22313. In embodiments, the machine learning system 22310 may receive training data, outcome data, simulation data, and/or any other data from other data sources 22214. In embodiments, the machine learning system 22310 may train/reinforce the machine learning models 22313 using the received data to improve the models.

In embodiments, the machine-learning system 22310 trains one or more models that are utilized by the artificial intelligence system 22312 to make classifications, predictions, recommendations, and/or to generate or facilitate decisions or instructions relating to the product and the part, such as decisions or instructions governing design, configuration, material selection, shape selection, manufacturing type, job scheduling, and many others.

In example embodiments, the artificial intelligence system 22312 trains a part failure prediction model. A failure prediction model may be a model that receives part related data and outputs one or more predictions or answers regarding the probability of part failure. The training data can be gathered from multiple sources including part specifications, environmental data, sensor data, machine vision data, and outcome data. Some examples of questions that the prediction model may answer are: when will the machine fail, what type of failure it will be, what is the probability that a failure will occur within the next X hours, what is the remaining useful life of the part, and the like. The artificial intelligence system 22312 may train one or more prediction models to answer different questions. For example, a classification model may be trained to predict failure within a given time window, while a regression model may be trained to predict the remaining useful life of the machine. In embodiments, training may be done based on feedback received by the system, which is also referred to as "reinforcement learning." The artificial intelligence system 22312 may receive a set of circumstances that led to a prediction (e.g., attributes of part, attributes of a model, and the like) and an outcome related to the part and may update the model according to the feedback.

In embodiments, the artificial intelligence system 22312 may use a clustering algorithm to identify the failure pattern hidden in the failure data to train a model for detecting uncharacteristic or anomalous behavior. The failure data across multiple parts and their historical records may be clustered to understand how different patterns correlate to certain wear-down behavior. For example, if the failure happens early in the print, the failure may be due to uneven print surface. If the failure occurs later on in the print, it is likely that the part became detached from the printing surface and the cause of failure is poor bed adhesion and/or warping. All of the information gathered can be used as feedback for the model. Over time, various failure modes will become associated with corresponding parameters. For example, poor bed adhesion is likely caused by incorrect temperature settings or printing orientation. Any failure to meet dimensional tolerances is likely caused by incorrect acceleration, speed, or layer height. The artificial intelligence system 22310 can determine the degree of correlation between each input and each failure mode.

In embodiments, the artificial intelligence system 22312 may be configured to monitor cutting tools, filters, and machine lasers to initiate maintenance or replacement as needed, including platform-wide maintenance management and as part of computerized maintenance management systems (MMS). In embodiments, additive manufacturing entities of a transaction enablement platform may be prepared, configured, and/or deployed to support replacement of parts. For example, in connection with a service visit to a home or business, an additive manufacturing unit may be designated to support the service visit, such as a mobile additive manufacturing unit and/or a unit located in sufficiently close proximity to the service visit to facilitate rapid delivery of items produced by the additive manufacturing unit. Based on the nature of the service visit (e.g., the type of equipment to be serviced, the nature of component parts and materials in the equipment, identified problems, and the like), the additive manufacturing unit may be equipped with appropriate materials, such as a combination of metal printing materials and other printing materials, that are suitable to print a range of possible replacement parts, specialized tools, or other elements to support the service visit. In embodiments, the platform may take inputs from or related to the service visit, such as inputs indicating the item being serviced (e.g., technical specifications, CAD designs, and the like); inputs indicating diagnosed issues (such as a need to replace an entire sub-assembly, a need to repair a crack or other damage, or the like); and inputs captured by cameras, microphones, data collectors, sensors, and other information sources associated with the service visit. For example, a service technician may capture a set of photos that show a damaged part. In embodiments, the platform may process the inputs, such as using an artificial intelligence system (such as a robotic process automation system trained on a training set of expert service visit data), to determine a recommended action, which in embodiments, may involve replacement of a part and/or repair of a part. The platform may, in some such embodiments, automatically determine (such as using an artificial intelligence system, such as robotic process automation trained on an expert data set) whether a replacement part is readily available and/or whether an additive manufacturing system should produce the replacement part, such as to reduce delay, to save costs, or the like. Similarly, the platform may, in some embodiments, using similar systems, automatically determine that an element should be additively manufactured to facilitate repair, such as where a complementary component may be generated to replace a worn or absent element. In embodiments, automatic determination may occur using a machine vision system that captures a set of photo images from the service visit, compares them to reference designs for applicable parts, and produces an instruction set for additively manufacturing a complementary element that can be added (such as by being adhered with a specified adhesive) to a defective element in order to render the part in compliance with the reference design. In any such embodiment that recommends or configures instructions for additive manufacturing, the platform may discover available units, configure instructions, initiate additive manufacturing, and provide updates to the service technician, such as updates as to when an element will be ready to use. In embodiments, the platform, such as through a trained AI agent, may automatically configure and schedule a set of jobs across a set of additive manufacturing units with awareness of the status of other relevant entities involved in service and other workflows, such as the overall planned duration of a service job (e.g., to allow de-prioritization of additive manufacturing jobs that will produce outputs that won't be used immediately), what other work is being done (e.g., to allow for appropriate sequencing of additive manufacturing outputs that align with overall workflows), the priority of the service job (e.g., whether it relates to a mission critical item of operating equipment, versus a non-critical accessory item), the cost of downtime, or other factors. In embodiments, optimization of workflows across a set of additive manufacturing entities may occur by having an artificial intelligence system undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, drill, or the like and/or finishing entities that polish, cure, or the like), including handoffs between sets of different manufacturing entity types, such as where handoffs are handled by robotic handling systems. In embodiments, a set of digital twins may represent attributes and capabilities of the various manufacturing systems, various handling systems (robotic systems, arms, conveyors, and the like, as well as human workforce), and/or the surrounding environment (such as a vehicle, a manufacturing facility, a campus, or even a larger scale entity, such as a city).

In embodiments, the artificial intelligence system 22312 may be configured to manage the real time dynamics affecting inventory levels for smart inventory and materials management. This may include, for example, forecasting inventory levels based on a set of demand factors and/or supply factors of various types described herein and configuring schedules for additive manufacturing units 22202 to produce items for locations where shortages are anticipated.

In embodiments, the artificial intelligence system 22312 may be configured to build, maintain, and provide a library of parts with preconfigured parameters, that may be searchable by materials, properties, part type, part class, industry, compliance, etc. This may include, for example, a set of search algorithms that discover parts by referencing published materials, including website materials, product specifications, or the like; a set of algorithms that query APIs or other interfaces of parts providers, such as to query databases for parts information; and/or a set of data collection systems that capture images, sensor data, test data, or the like of or about parts.

In embodiments, the artificial intelligence system 22312 may be configured to analyze usage patterns associated with one or more users and learning user preferences with respect to outputs, timing, materials, colors, shapes, orientations, and/or print strategies. For example, the system 22312 may develop a profile, such as by the additive manufacturing unit 22202, by location, by user, by organization, by role, or the like, that indicates what materials were used for manufacturing, what processes were used for manufacturing, what shapes were produced, what finishing steps were undertaken, what colors were used, what functions were enabled, and the like. The profile may be used to determine, infer, or suggest preferences of users, organizations, or the like. For example, an organization's preferred brand colors may be recognized, such that conforming materials and coatings are recommended and/or preconfigured in development of additive manufacturing steps.

In embodiments, the artificial intelligence system 22312 may be configured to perform real time calibration for one or more 3D printers. This may include training on a training data set of calibration interactions of expert users. Calibration may be job-specific, such as by training the artificial intelligence system 22312 to calibrate the additive manufacturing unit 22202 to operate with a specific material, which may include material from a specific bin or lot of the same general type of material.

In embodiments, the artificial intelligence system 22312 may be configured to minimize the material waste production during the additive manufacturing process. This may include configuring production to minimize material that needs to be removed in finishing steps, configuring production to produce outputs where unused material is easily removed for reuse, and/or configuring production to favor reusable/recyclable materials.

In embodiments, the artificial intelligence system 22312 may be configured to detect cyber security risks and threats to the platform 22210.

In embodiments, the artificial intelligence system 22312 may be configured to assess regulatory compliance. For example, in embodiments, the artificial intelligence system 22312 may be configured to search a library or other source of approved or certified product designs, such as ones that are UL or CE certified, FDA approved, OSHA-approved, or the like, and compare a design configuration to the same to confirm that an output of additive manufacturing will result in a compliant/approved form of product. In embodiments, the artificial intelligence system 22312 may work with a digital twin system, a simulation system, or the like to simulate performance of a resulting output and may compare the simulated performance to regulatory or other requirements, such as ones applying to the ability to withstand forces, chemical effects, biological effects, radiation, or the like. For example, where a product component, such as a housing, is intended to provide shielding from radiation, the artificial intelligence system 22312 may operate on or within a digital twin that includes a radiation propagation physics model to automatically assess whether product materials, thicknesses, and shapes will provide shielding sufficient to meet regulatory and/or design requirements.

In embodiments, the artificial intelligence system 22312 may be configured to optimize power consumption for the platform 22210. This may include training the artificial intelligence system 22312 on a training set of operational data that includes (a) measuring power consumed by various available activities; (b) training the artificial intelligence system 22312 to undertake scheduling of additive manufacturing jobs according to a predictive model of energy pricing; and/or (c) having the artificial intelligence system undertake a large body of simulations to select a preferred sequence of operations that produces a favorable power consumption pattern.

In embodiments, the models trained by machine learning system 22310 may be utilized by the artificial intelligence system 22312 to execute simulations on part twins for predicting part shrinkage or expansion. This may include having the artificial intelligence system 22312 use a set of physical models that include thermal coefficients of expansion for elements, alloys, compounds, mixtures, and/or combinations, including, in embodiments, graded layers of material where there is not a clear boundary between materials. In embodiments, the artificial intelligence system 22312 may be trained based on observed shrinking and/or expansion during manufacturing and/or use.

In embodiments, the models trained by machine learning system 22310 may be utilized by the artificial intelligence system 22312 to execute simulations on part twins for predicting part warpage. This may include having the artificial intelligence system 22312 use a set of physical models that include thermal coefficients of expansion for elements, alloys, compounds, mixtures, and/or combinations, including, in embodiments, graded layers of material where there is not a clear boundary between materials. In embodiments, the artificial intelligence system 22312 may be trained based on observed warpage during manufacturing and/or use.

In embodiments, the models trained by the machine learning system 22310 may be utilized by the artificial intelligence system 22312 to execute simulations on part twins for calculating necessary changes to the 3D printed process to compensate for part shrinkage, expansion, and/or warpage.

In embodiments, the models trained by machine learning system 22310 may be utilized by the artificial intelligence system 22312 to execute simulations on part twins for testing the compatibility of additively manufactured parts. In embodiments, the compatibility may be tested with one or more other parts in an assembly. In embodiments, the compatibility may be tested with an operating environment. In embodiments, the compatibility may be tested with a 3D printer. Compatibility may include shape compatibility (e.g., key-in-lock; housing-around-interior; peg-in-hole; male-with-female, support-with-supported, or other types of interface/interconnect compatibility); environmental compatibility (e.g., compatibility of materials with anticipated environment of use, such as chemical factors, physical factors, radiation factors, biological factors, temperatures, pressures, and the like); functional compatibility (e.g., ability to withstand loads, stresses, torsion, or the like), and others.

In embodiments, the models trained by machine learning system 22310 may be utilized by the artificial intelligence system 22312 to execute simulations on part twins for predicting deformations or failure in an additively manufactured item.

In embodiments, the models trained by machine learning system 22310 may be utilized by the artificial intelligence system 22312 to execute simulations on part twins for optimizing the build process to minimize the occurrence of deformations.

In embodiments, the models trained by the machine learning system 22310 may be utilized by the artificial intelligence system 22312 to execute simulations on product twins for predicting the price of a product. In embodiments, prediction of a price may include: (a) prediction based on market prices of similar items (and/or forecasts of such prices); (b) prediction based on predicted demand; (c) prediction based on committed demand; (d) prediction based on smart contract terms and conditions; and/or (e) prediction based on cost, including materials, energy costs, shipping, and labor, among others (which may include a range of profit/markup amounts to arrive at a price from a base cost). In embodiments, price prediction may include wholesale pricing, retail pricing, volume pricing, location-based pricing, and the like.

In embodiments, the models trained by machine learning system 22310 may be utilized by the artificial intelligence system 22312 to execute simulations on part twins, product twins, and printer twins for generating additive manufacturing quotes.

In embodiments, the models trained by the machine learning system 22310 may be utilized by the artificial intelligence system 22312 to execute simulations on part twins, product twins, and printer twins for generating recommendations related to printing to a user of the platform. In embodiments, the recommendations may relate to a choice of a material for printing. In embodiments, the recommendations may relate to a choice of an additive manufacturing technique. In embodiments, recommendations may relate to timing of manufacturing.

In embodiments, the models trained by machine learning system 22310 may be utilized by the artificial intelligence system 22312 to execute simulations on part twins, product twins, and printer twins for predicting delivery times for additive manufacturing jobs. Simulations may include ones that vary at a level of priority to determine a predicted delivery time under different priority levels (such as to indicate tradeoffs between latency and price/cost).

In embodiments, the models trained by machine learning system 22310 may be utilized by the artificial intelligence system 22312 to execute simulations on part twins, product twins, printer twins, manufacturing node twins, or others for predicting cost over-runs in the manufacturing process.

In embodiments, the models trained by machine learning system 22310 may be utilized by the artificial intelligence system 22312 to execute simulations on part twins, product twins, printer twins, and manufacturing node twins for optimizing the production sequencing of parts based on quoted price, delivery, sale margin, order size, or similar characteristics. In embodiments, optimization may include optimization based on public data, such as market data, website data, manufacturer-provided data (such as by APIs), and/or terms and conditions of a set of smart contracts that relate to such characteristics.

In embodiments, the models trained by the machine learning system 22310 may be utilized by the artificial intelligence system 22312 to execute simulations on part twins, product twins, and printer twins for optimizing the cycle time for manufacturing. In embodiments, the optimizing of cycle time includes time for post-processing (which can vary dramatically per part specifications and additive manufacturing technology).

In embodiments, an instruction set for additive manufacturing may be automatically generated from a text description, such as using a blend of natural language-based artificial intelligence and other artificial intelligence for handling and/or generating images and/or spatial representations, such as using the DALL-E language model from OpenAI™ or other transformer language model (a combination of text-based and image-based models) further combined with a model for transforming an image into a 3D model and/or a model for transforming an image or 3D model into an additive manufacturing instruction set. The hybrid transformer artificial intelligence system may, for example, be trained to generate a set of parameters that represent a set of semantic objects (such as a pair of glasses and a cat), generate an output design (such as glasses that have catlike attributes, such as whiskers or cats-eye lenses), and convert the output design into an additive manufacturing instruction set. In such embodiments, a user may, for example, enter a text string for a desired output and be provided with a range of 3D models representing options. The user may select the preferred option and initiate an additive manufacturing job to produce the item. In embodiments, the platform may track interests, attributes, search results, profiles, news topics, or other factors to generate a set of input text strings to produce a set of objects that are recommended for additive manufacturing for a user. In embodiments, recommendations are based on similarity to other users, such as based on clustering techniques. In embodiments, recommendations are based on collaborative filtering.

In embodiments, the digital twins 22314 are configured to communicate with a user via multiple communication channels such as speech, text, gestures, and the like. For example, the digital twin may receive queries from a user about the distributed manufacturing network entities, generate responses for the queries, and communicate such responses to the user. Additionally, digital twins may communicate with one another to learn from and identify similar operating patterns and issues in other distributed manufacturing network entities, as well as steps taken to resolve those issues. For example, the digital twins of two manufacturing nodes or those of a part, a printer, and a manufacturing node may communicate with one another for resolving or answering a customer request.

FIGS. 227A-C are schematics illustrating an example implementation of an autonomous additive manufacturing platform including various components along with other entities of a distributed manufacturing network according to some embodiments of the present disclosure.

The autonomous additive manufacturing platform 22210 may collect data from one or more entities including users, programs, and the data sources 22214. A data acquisition system 22702 in user interface 22212 may include a set of interfaces like a chat interface 22704, a smart voice interface 22706, and a file upload interface 22708 to collect data from one or more users of the platform. Additionally, one or more sensors 22710 including camera and machine vision system, acoustic/sound sensors (e.g., with microphones, including optionally multiple microphones in an array), power and energy sensor, mass sensor, location sensor, temperature sensor, humidity sensor, pressure sensor, viscosity sensor, flow sensor, chemical/gas sensor, strain gauge, thermal imaging, hyperspectral imaging, sound sensor, air quality sensor, and the like may provide data to platform 22210. The data sources 22214 may also include programs, the feedback sources 22712 providing outcome data from the machine learning system 22310 and a data library 22714.

In embodiments, a data visualization 22715 in the user interface 22212 may provide a set of dashboards, interfaces, and integrations for a user of the platform 22210 to visualize information related to the distributed manufacturing network 22230 or one or more entities in the network 22230. For example, a dashboard may provide visualizations including information related to digital threads for distributed manufacturing network entities like a 3D printed part or a product. Another dashboard may provide visualizations including information about real time visibility of status of a manufacturing order. An alternate dashboard may provide visualizations including information related to batch traceability to identify parts from the same batch. A dashboard may provide visualization of demand factors, including predicted demand, inventory levels, and the like. A search interface may be provided to resolve queries from one or more users based on part, machine, production date, or location. In embodiments, a virtual reality (VR) system may be integrated with the data visualization 22715 and modelling system 22720, thereby enabling a user to build 3D models in VR. In embodiments, the virtual reality system may be integrated with a scanning system 22717, such as allowing a user to build models that consist of scanned data (such as point clouds) and/or combinations of model-based VR and scans (and/or other augmentations or overlays, such as in augmented reality and/or mixed reality models). This may also include a wider set of user interactions for developing part designs without in-depth expertise including using augmented reality (AR) and mixed reality (MR).

In embodiments, the user interface 22212 may include a single click pre-processing process triggering pre-set configurations for part orientation, support determination, toolpath generation, and/or nesting.

In embodiments, the user interface 22212 may include a single click post-processing process triggering pre-set configurations for de-powdering, support removal, and surface finishing.

A user of the platform may also use the simulation system 22216 to build CAD and STL files capturing the design of the part or product to be printed. A set of design tools 22716 and design libraries 22718 may allow a user to build models in modelling system 22720 and run simulations in simulation environment 22722. In embodiments, the design of the part or product may be captured in various file formats including but not limited to, IGES files, SolidWorks files, Catia files, ProE files, 3D Studio files, STEP files, and Rhino files. In embodiments, the design may be captured in the form of digital images, such as in PNG files, JPEG files, GIF files, and/or PDF files, as well as scanned data formats, such as point clouds produced by laser scanning and outputs from ultrasound, MRI, x-Ray, electron beam, radar, IR, and other scanning systems.

The data storage system 22304 may store data in a distributed ledger 22724, a digital thread 22726, or the like, such as for maintaining a record of event data 22728 and a state data 22730 for an entity or asset of the distributed manufacturing network 22230 over time, including a part or products or any other asset or entity described herein.

In embodiments, the digital thread 22726 constitutes information related to the complete lifecycle of an item produced by additive manufacturing, such as a part, from design, modeling, production, validation, use, and maintenance through disposal.

In embodiments, the digital thread 22726 constitutes information related to one or more additive manufacturing machines or tools including post-processing tools such as CNC equipment, robotics support, product/part marking, metrology equipment, and the like across multiple manufacturing facilities/locations.

In embodiments, the digital thread 22726 constitutes information related to the complete lifecycle of a product from design, modeling, production, validation, use, and maintenance through disposal, optionally including aggregated, linked, or integrated information from multiple constituents into a full product digital thread.

The data processing system 22306 processes the data collected by data collection and the management system 22302 to optimize and adjust the process parameters in real time through the artificial intelligence system 22312 (including the machine learning system 22310), the digital twin system 22314, and the control system 22316 as described in detail in FIGS. 223, 224, 225, and 226 or elsewhere herein or in the documents incorporated herein by reference.

The manufacturing workflow management applications 22308 may manage the various workflows, events and applications related to production or printing and transaction enablement platform management. In embodiments, a matching system 22732 may help with matching a set of customer orders with a set of additive manufacturing units 22202 or manufacturing nodes. Orders may include firm orders, contingent orders (e.g., based on price contingency, timing contingency, or other factors), aggregated orders, custom orders, volume orders, time-based orders, and others. In embodiments, orders may be expressed in smart contracts, such as operating on a set of blockchains. The matching may be based on factors like additive manufacturing capabilities, locations of the customer and the manufacturing nodes, available capacity at each node, material availability, pricing (including materials, energy, labor, and opportunity costs of other available uses for capacity), and timeline requirements. In embodiments, different parts of a product may be matched with different manufacturing nodes, and the product may be assembled at one of the nodes or elsewhere in a transaction enablement platform before being finally delivered to the customer.

In embodiments, the additive manufacturing platform may be configured to maintain an inventory of parts available to large airplane or sea-going systems in which multiple redundancies are mandated by custom and/or regulation. In embodiments, example systems include double, triple, or more redundancies over primary operation systems. In these examples, certain systems may benefit from ready-to-be made products filling in for the third, fourth, etc. redundancy when, previously, a full inventory to adequately supply the entire third, fourth, etc. redundancy was required. It will be appreciated in light of the disclosure that not all systems will be applicable, in that some critical systems may only permit such parts as further layers of redundancies to the already mandated supplies. While in flight, the desire to minimize weight and energy consumption may limit the desire for the creation of certain parts, and the ability to generate parts on longer endurance flights to attend to the needs of the cabin may be one motivation to provide some inflight functionality. For example, locking components that may fail mid-flight, such as latches, hinges, seatbelts, and the like, can be replaced or temporarily locked closed to improve in-cabin safety. Components that may have come loose may also be shimmed or temporarily lodged in place by a custom printed part to wedge or hold parts in place throughout the flight. Examples include holding avionic components in a dashboard, overhead, or other cockpit controls, holding hospitality items in the galley, holding seats on seat rails, and the like.

In an example, the additive manufacturing platform can be used to create additional inventory to outfit the airplane for items constructible inflight that are required on the minimum equipment list to fly and have those parts replaced before the airplane lands and returns to the gate for service, thus at least contributing to a repair that otherwise would not require an early landing, but may prevent the next dispatch of the airplane to its next desired use.

In sea-going embodiments, the additive manufacturing platform may be used to create additional inventory to outfit the sea-going vessel with items constructible during the voyage that are required on the mandated minimum equipment list to embark (or the like) and have those parts replaced before the vessel moors and reloads, thus at least contributing to a repair that otherwise would not require a detour and coming ashore early, but may prevent the next timely dispatch of the vessel to its next desired use.

In embodiments, the additive manufacturing platform may be configured to coordinate with land-based additive manufacturing assets to coordinate construction of parts and coordinated portions of greater assemblies so downtime in port or in the hanger can be minimized. In this example, entities providing just in time maintenance inventories can extend their reach and depth by augmenting their one or more offerings or coordinating their one or more offerings within port or in hanger systems that can be coordinating with one or more in-situ systems active during voyage and/or flight.

In embodiments, the matching system 22732 helps with matching an additive manufacturing task with an engineer where the matching may be based on factors like task complexity, engineer experience, and expertise. In embodiments, the matching system 22732 helps with matching an additive manufacturing task with the location and/or availability of a finishing worker where the matching may be based on factors like task complexity, worker experience, and expertise. In embodiments, the matching system 22732 helps with matching an additive manufacturing task with a set of additive manufacturing units 22202.

In embodiments, a scoring system 22734 helps with scoring and rating various entities in the distributed manufacturing network 22230, such as based on their performance, quality, timeliness, condition, status, or the like. In embodiments, the scoring system 22734 helps with rating a manufacturing node based on a customer satisfaction score, such as for meeting customer requirements. In embodiments, the scoring system 22734 helps with rating an engineer or other worker based on the condition/performance in completing an additive manufacturing task, including time required, quality of output, energy used, and other factors. In embodiments, the scoring system 22734 helps with rating the additive manufacturing unit 22202 based on the condition or performance in completing an additive manufacturing task, including process metrics, output metrics, product quality measures, economic measures (such as ROI, yield, profit, and the like), customer satisfaction measures, environmental quality measures, and the like.

In embodiments, an order tracking system 22736 helps with tracking a product order through its movement in the distributed manufacturing network 22230 till it is finally delivered to the customer. The order tracking system 22736 may receive state data from various entities of the distributed manufacturing network 22230 on real-time or a near real-time basis. For example, a 3D printer may provide updates on production stage data or a shipping system may provide updates on product location. This information may then be tracked, such as by a user or customer identity, on real time or near real-time basis through the order tracking system 22736. A workflow manager 22738 manages the complete 3D printing production workflow for the distributed manufacturing network 22230 including various events, activities, and transactions related to one or more entities of the network 22230.

In embodiments, an alerts and notifications system 22740 provides alerts, notifications, or reports about one or more events to a user or customer of the network 22230. For example, the alerts and notifications system 22740 may receive data related to certain production parameters or errors based on monitoring of the production workflow, based on which alerts and notifications may be generated. Such alerts, notifications, or reports may then be transmitted to a computing device (e.g., a computer, tablet computer, smart phone, telephone, mobile phone, PDA, TV, gaming console, and the like) of a user or customer via email, text message, instant message, phone call, and/or other communication (e.g., using the Internet or other data or messaging network).

In embodiments, the error notifications may provide options for a use of the platform 22210 related to continuing or stopping production or making adjustments to the design or production settings.

In another example, a user or customer of the distributed manufacturing network may be provided with custom reports, including live status and analytics based on real-time and historical data of the distributed manufacturing network 22230. In embodiments, the custom report may include data and analytics related to demand, production capacity, material usage, workflow inefficiencies, output type, output parameters, materials used, cost, ROI, and the like across one or more manufacturing nodes in the network.

In embodiments, the payment gateway 22742 manages the entire billing, payment, and invoicing process for a customer ordering a product using the distributed manufacturing network 22230. This may include recording events or transactions on an account or ledger, such as a distributed ledger, such as a blockchain-based ledger. Payments may be allocated according to a set of rules, such as embodied in a smart contract, such as to allocate payments across payees; for example, printing from a copyright-protected or other proprietary instruction set may trigger a royalty payment to the intellectual property owner, manager, or the like.

It will be apparent that these applications provided by the platform 22210 are only presented by way of example and should not be construed as limiting the scope, and many other applications may be provided to manage one or more aspects of the distributed manufacturing network 22230.

In embodiments, an authentication application may be provided to authenticate the identity of users of the platform through one or more authentication mechanisms including a simple username/password mechanism, biometric mechanism, or cryptographic key exchange mechanism. Similarly, an authorization application may define the roles and access privileges of users of the platform such that users with different roles are provided different access privileges. For example, an “administrator” or “host” privilege may allow a user of the platform to make changes to platform configuration, add and remove programs, access any files, and manage other users on the platform; an “engineer” privilege may allow a user of the platform to operate the platform; and a “service” privilege may allow a user of the platform to access a subset of administrator privileges to perform maintenance and repair activities.

Some other example applications provided by the platform 22210 for production management include part marking, slicing tool selection, alerts and notifications for feedstock supply, printing queue management, printer floor management, job scheduling (including across multiple units), finish work management, packaging management, preparation for logistics, and the like. Some example applications provided by the platform 22210 for production reporting include order failure reporting, management information system alerts, remote quality assurance, certification, indexing, and the like. Some example applications provided by the platform 22210 for production analysis include order matching, production failure analysis, warranty management, and so on.

In embodiments, the platform 22210 is integrated with one or more third party systems of various types described herein and in the documents incorporated by reference herein, such as an Enterprise Resource Planning (ERP) system 22744, a Manufacturing Execution system (MES) 22746, a Product Lifecycle Management (PLM) system 22748, a maintenance management system (MMS) 22750, a Quality Management system (QMS) 22752, a certification system 22754, a compliance system 22756, a Robot/Cobot system 22758, an SCCG system 22760, and the like. In embodiments, the platform is integrated into a transaction enablement platform control tower system, such as for managing a set of transaction enablement platform entities.

In embodiments, an API system facilitates the transfer of data between the platform 22210 and one or more third party systems. The API system may consist of a set of APIs for transfer of instruction sets, for passing alerts, notifications, and the like, for transmitting event streams (such as workflow-related events), for passing sensor data (such as process sensing from manufacturing, environmental sensing and others), for handling user data, for processing payments, for integrating with smart contracts, blockchains, and other systems, for passing data with AI systems, for passing data with 3D rendering and other modeling systems, and many others.

In embodiments, the Enterprise resource planning (ERP) system 22744 helps streamline and integrate business processes across finance, sales, marketing, service, engineering, product management, accounting, procurement, distribution, resources, project management, risk management, and compliance, among other functions, both within a manufacturing node and across multiple manufacturing nodes in the distributed manufacturing network 22230. ERP System 22744 may tie together various production and transaction enablement platform processes in the distributed manufacturing network 22230 and enable the flow of data between them.

In embodiments, the manufacturing execution system (MES) 22746 connects and monitors machines, processes, equipment, tooling, and materials to streamline manufacturing operations both within a manufacturing node and across multiple manufacturing nodes in the distributed manufacturing network 22230.

In embodiments, an additive manufacturing platform, such as that associated with a transaction enablement platform or other network, may be designed, prepared, configured, and/or deployed to support the design, development, manufacture, and distribution of parts and maintenance materials (e.g., oil, gas, other chemicals) for vehicles used to distribute products that may include trucks, trains, airplanes, boats, drones, etc.; parts and maintenance materials for machines (e.g., robots) used in packaging products; parts and maintenance materials for tools and machines (e.g., robots) used in moving packaged products from warehouse to vehicles; arts repair on existing parts (and, while in service); missing parts from a product that is otherwise ready to go; or some other part or component for the design, development, manufacture, and distribution of parts and maintenance materials.

In embodiments, an additive manufacturing platform, as described herein, may be designed, prepared, configured, and/or deployed to support the monitoring of packaging materials (e.g., boxes, crates, wrap material, and the like) and need to generate more "as needed." The additive manufacturing platform may address a "recall" situation by adding or revising a product in-warehouse, monitoring for problems with vehicles, machines, tools, and other equipment being used, replacing needed parts or materials "as needed," creating tools on-demand as needed by workers or robots in warehouse/distribution network, and the like.

In embodiments, an additive manufacturing platform, as described herein, may be designed, prepared, configured, and/or deployed to support processing manufacturing inputs, such as using an artificial intelligence system (e.g., a robotic process automation system trained on a training set of expert service visit data) to determine a recommended action, which, in embodiments, may involve replacement of a part and/or repair of a part or some other activity. In embodiments, the additive manufacturing platform may automatically determine that an element should be additively manufactured to facilitate repair, such as where a complementary component may be generated to replace a worn or absent element. In example embodiments, some techniques and/or technologies that may be utilized with the warehouse/distribution center may include, but are not limited to: providing and/or including multiple source materials to generate in real time (i.e., on the fly) different tools, parts, and/or packaging; using AI to optimize product design, manufacturing process configuration (including packaging material generation process), job scheduling, prioritization, and/or logistics (efficiency of warehouse processes for replacing parts, materials, and the likes without disrupting other general processes involved in warehouse/distribution center); enriching AI with input/source/training set data relevant to design factors, economic factors, quality factors, etc. involved in particular example embodiments (e.g., using sensors and monitoring of data to adjust manufacturing processes of parts materials needed for machines and/or packaging materials); coupling inputs, process data, and outputs with digital twins for running simulations of individual processes or a combination of processes to anticipate material needs for being able to produce or manufacture tools, parts, packaging, and/or fix machines with materials in real time (as needed); networking additive manufacturing nodes in meshes and/or fleets for coordinated operation within a warehouse/distribution network in an efficiency manner with respect to producing tools, parts, packaging, and/or other materials used to fix machines in real time; using robots that are able to attach to machines and then print directly onto a product, print tool, print parts for machines used in warehouse/distribution network, print packaging, and/or print materials used to fix machines in real time; using hybrids/pairs of different types of 3D print additive manufacturing including any and all of the items listed within warehouse/distribution center network processes for fixing products, producing tools, producing parts, producing packaging, and/or producing other materials to fix machines in real time (as needed).

In embodiments, the Product Lifecycle management (PLM) system 22748 helps manage the part or product across the entire lifecycle, from conception and design through manufacturing and distribution to customer use and service. The PLM system 22748 may contain accurate, real-time product information across the lifecycle and transaction enablement platform. This helps with developing and managing the product in a manner that is responsive to feedback from one or more distributed manufacturing network entities, such as customers using the product, distributors, logistics providers, regulators, safety professionals, service professionals, salespeople, product managers, designers, resellers, and many others. This may also enable an accelerated proof of concept and rapid customization of the product in the product development stage. Also, this may help with predicting product demand and prices, improving customer engagement, performing product testing while in customer use, and providing pre-emptive warranty management.

In embodiments, the maintenance management system (MMS) 22750 monitors a set of 3D printers, cutting tools, filters, machine lasers, and other machines, manages spare parts, maintains records, and uses artificial intelligence and machine learning models to efficiently self-diagnose maintenance requirements and generate work orders. In embodiments, the MMS 22750 monitors a set of other machines, equipment, products, fixtures, or other assets, maintains records, and manages maintenance operations for that set of items, including coordinating additive manufacturing workflows (such as to produce spare parts, tools, workpieces, accessories, replacement elements, and the like) with other maintenance workflows. In embodiments, this occurs with automation, such as robotic process automation, such as where an RPA agent is trained upon a set of expert interactions to undertake, or to support, operations performed by maintenance workers.

In embodiments, the Quality Management system (QMS) 22752 determines whether a printed part has been produced correctly by comparing real time sensor data with expected feedback data wherein the expected feedback data is generated from at least one of historical data, test data, and machine learning. In embodiments, the QMS 22752 also generates warranty certification including the duration of part warranty and scope of coverage upon determining completion of testing and quality assurance.

In embodiments, the QMS 22752 includes automated part metrology and utilizes a vision system with variable focus optical system and artificial intelligence-based pattern recognition for automated part metrology. In embodiments, the vision system may include a conformable variable focus liquid lens assembly and a processing system that dynamically learns on a training data of outcomes, parameters, and data collected from the conformable variable focus liquid lens assembly to train an artificial intelligence system to recognize an object. The conformable variable focus liquid lens assembly may constantly adjust based on environment factors and on feedback from the processing system to generate training data that is deeper in context and that corresponds to the physical light that the image represents. By training the vision system to recognize objects using variable optical parameters through the liquid lens assembly, the processing system may learn about the most optimum optical setting to detect an object. The vastly more dynamic input to the vision system may result in creating a richer context and providing superior object recognition.

In embodiments, the certification system 22754 is configured to generate workflow and process control documentation to obtain certificates of conformance from one or more Manufacturing Certification Authorities or Standards Authorities. In embodiments, the one or more Manufacturing Certification Authorities or Standards Authorities include International Organization for Standardization (ISO), European Certification (CE marking) bodies, Underwriters Laboratories (UL), Society of Automotive Engineers (SAE), Federal Aviation Administration (FAA), TUV SUD, DNV GL, AS9100, IAQG 9100, American Society of Testing and Materials (ASTM), NIST (research, measurement science and standards), Fraunhofer Institute (research), and Sandia National Labs (research).

In embodiments, the compliance system 22756 is configured to perform compliance checks on 3D printed parts. In embodiments, compliance checking occurs by or with support from robotic process automation, such as where a compliance model or algorithm is trained by qualified experts in certification/compliance with a specific requirement on a training set of compliance review data or the like. In embodiments, a set of domain-specific or topic-specific models may be trained, such as one for each compliance domain or topic, such as for compliance with environmental standards, material standards, structural standards, chemical standards, safety standards, electrical standards, fire-related standards, and many others.

In embodiments, robot/cobot system 22758 may include an autonomous robotic system or arm unit integrated with a set of additive manufacturing units 22202. For example, the additive manufacturing unit 22202 may be contained within the housing or body of a robotic system, such as a multipurpose/general purpose robotic system, such as one that simulates human or other animal species capabilities. Alternatively, or additionally, the additive manufacturing unit 22202 may be configured to deliver additive layering from a nozzle that is disposed on an operating end of a robotic arm or other assembly.

In embodiments, the autonomous additive manufacturing platform 22210 may create and manage profiles of different distributed manufacturing network entities. For example, profiles may include, without limitation: a part or component profile with accompanying part data structures that may store part-related information and component-related information, including name, number, class, type, material(s), size, shape, function, performance specifications, and the like; a batch profile with accompanying batch data structures for storing batch-related information including batch number, batch date, bin number, batch type, location information (such as origin), batch inspection data, and the like; a machine profile with accompanying machine data structures for storing machine related information including identifier, name, class, function etc.; a manufacturing node profile with accompanying manufacturing node data structure for storing information related to manufacturing node including identifier, location, order history, production capacity, and previous product designs; a packager profile with accompanying data structures for storing packaging related information; a user profile with accompanying user data structures for storing user related information; and a behavioral profile with accompanying data structures for storing behavioral information, among many others. Some examples of users of the platform 22210 may include a designer looking to generate a design for fabrication; an engineer looking to print and manufacture a part; a CFO looking to optimize price for production; or a customer looking to get a product printed. Users may include role-based users, such as described in connection with other use cases referenced herein and in the documents incorporated herein by reference, such as various users described in connection with digital twins, such as executive and other role-based digital twins, consumers of automatically generated data stories, and many others.

The metal additive manufacturing platform 22210 described herein may help in automating and optimizing a very wide range of manufacturing and transaction enablement platform functions.

Process and Material Selection

The selection and use of one or more processes or materials for additive manufacturing may be automated and optimized. The platform 22210 may take as input the product requirements in terms of part properties, price, performance characteristics etc. and automatically determine the processes or material for building the part. The artificial intelligence system 22312 may consume model information comprising physical, chemical, and/or biological models of material behavior, including structural, stress, strain, wear, load bearing, response to contamination, chemical interaction with other materials, interaction with biological elements (antibacterial, antiviral, toxicity), etc. The artificial intelligence system 22312 may then automate and optimize process and material selection, including based on expert feedback and/or feedback from trials/outcomes.

Referring now to FIGS. 223, 224, and 228 an example embodiment for automating process and material selection is described.

A part design comprising model information and product requirements is presented to the design and simulation 22216 where it is evaluated for manufacturing compatibility with at least one type of the additive manufacturing unit 22202 in the manufacturing node 22200. The design and simulation 22216 may be assisted by the artificial intelligence 22312, the simulation management 22614, the printer twin 22606 (which, in embodiments, may be a twin of any type of additive manufacturing unit), and the process and material selection twin 23502 for performing the optimization. An example analysis includes the use of the printer twin 22606 in the digital twins 22314 to simulate and compare part design dimensions and accuracy with available 3D printer working envelopes and specifications.

After a part design is validated to be compatible with one or more of the additive manufacturing units 22202 in the manufacturing node 22200, part data for manufacturing may be optimized for export at the design and simulation 22216. For example, an optimized STL file may be produced from a finely meshed 3D CAD surface model to meet part accuracy requirements and then be exported to the autonomous additive manufacturing platform 22210.

The autonomous additive manufacturing platform 22210 may include a process and material selection system 23504. Using optimized part data from the design and simulation 22216, external information, including pricing and market related information from sources such as the transaction enablement platform entities 22226, and help from the artificial intelligence system 22312, the process and material selection system 23502 performs analysis to select one or more of the additive manufacturing units 22202 for part manufacturing. In one example, the process and material selection system 23502 may analyze availability and cost of printer feedstock materials to select the additive manufacturing unit 22202 that manufactures the part according to specifications while optimizing for the lowest cost of manufacture.

Referring to FIGS. 224, 226, and 228, when manufacturing is complete, part and process data related to the outcome of the 3D printing process is collected by the data collection and management system 22302. Outcome data is provided to the machine learning system 22310, along with simulation, external, and training data to train or improve the initial machine learning model 22313.

The following is an example of autonomous design validation and selection of a 3D printing process and material. Referencing FIGS. 222 and 223, part design data is entered at the user interface 22212 and is then provided as input to the design and simulation 22216 for part validation. The part design data provided at the user interface 22212 may include the following part specifications and order requirements: A form or shape described by a 3D CAD solid model; Use-case loading as applied to the provided 3D CAD model; Part design stress factor of safety: >2; Maximum part weight; Corrosion requirement; Compatibility with seawater and salt spray; Order part quantity 10; and Delivery time.

With help from the artificial intelligence system 22312, the design and simulation 22216 performs multiple screening analyses as follows: a material analysis that identifies titanium, Inconel, and 22416 stainless steel as materials that meet corrosion requirements; a material analysis, assisted by simulations from the printer twin 22606 and the process and material selection twin 23502 that identifies powder bed fusion or metal material extrusion as 3D printing processes that match availability of the additive manufacturing units 22202; a stress and weight matrix analysis calculated for part geometry and loading that eliminates Inconel and 22416 stainless steel due to weight considerations, but qualifies titanium for both weight and maximum stress. Following completion of the screening analysis, process and selection system 23504 is used to complete final additive manufacturing unit 22202 selection from the subset of additive manufacturing units 22202 available for manufacturing.

Hybrid Part Workflows

The selection and use of one or more hybrid manufacturing workflows optimized for applying additive material on existing parts may be automated to produce a modified part assembly. Hybrid part workflows can be used to develop new manufacturing processes, repair existing parts, and modify existing parts to improve transaction enablement platform outcomes.

The autonomous additive manufacturing platform 22210 may take as input existing and OEM part information comprising physical, chemical, manufacturers specifications, etc., including information based on expert feedback and/or feedback from trials/outcomes. The AI system 22312 uses input data to help with automatic validation of a part for one or more hybrid workflows in the workflow management applications 22308.

In a part repair example, data from the user interface 22212 and the data sources 22214 are provided to the design and simulation 22216. Example data includes a combination of measurements and expert observations and/or OEM part information such as specifications and CAD models. The design and simulation system 22216 analyzes part dimensional and material repair requirements with reference to their compatibility with at least one type of additive manufacturing unit 22202 in the manufacturing node 22200. The design and simulation 22216 may be assisted by the artificial intelligence 22312, the simulation management 22614, and the digital twins 22314, for example, analyses may include the use of the printer twin 22606 and the part twin 22604 in the digital twins 22314 to simulate modified part manufacturing outcomes using available 3D printer capabilities or determine compatibility of OEM part material with available 3D printer materials.

After a modified part is validated by the design and simulation 22216 to be compatible with one or more of the additive manufacturing units 22202 in the manufacturing node 22200, modified part data is exported to the autonomous additive manufacturing platform 22210 where the process and material selection system 23504 selects one or more of the additive manufacturing units 22202 for manufacturing using one or more hybrid workflows. Example hybrid workflows include the build-up of worn part areas or replacement of chipped or cracked areas of parts.

Referring to FIGS. 226 and 227, when modified part manufacturing is complete, part and process data related to the outcome of the 3D printing process is collected by the data collection and the management system 22302, where data comprising modified part parameters, measurements, and so on can be exported to systems responsible for managing warranty, safety, and related compliance, for example, the ERP system 22744, the certification system 22754, the compliance system 22756, etc. In embodiments, data may be used to set parameters for a smart contract, such as populating warranty-related, safety-related, liability-related, or other terms of a smart contract. The platform and/or smart contract may store the data in a blockchain.

In embodiments, hybrid manufacturing workflows may be used to modify an existing part design to produce a new design, for example, when incorporating new functional or safety features that improve part performance.

In embodiments, hybrid manufacturing workflows may be used to produce new parts comprising multiple materials that may require more than one 3D printer or 3D printing process to produce targeted part or product characteristics.

Referring to FIGS. 222 and 223, in embodiments, hybrid manufacturing workflows may specify and manage specialized pre-processing 22204 and post-processing 22206 for the additive manufacturing unit 22202 manufacturing. Examples include part cleaning, machining, grinding, surface finishing, etc. to enable 3D printing or to produce modified parts that meet original equipment part specifications.

Feedstock Formulation

The selection, purchase, and management of 3D printer feedstock may be automated and optimized to improve manufacturing efficiency, control transaction logistics and cost, and to provide new part production capabilities.

Referring now to FIG. 228, a feedstock formulation system 23506, helped by the artificial intelligence 22312 and a feedback formulation twin 23508, automatically formulates and adjusts 3D printer feedstock according to production requirements, transaction conditions, pricing and availability information, or other data. For example, the feedstock formulation system 23506 may select commercially available feedstock such as Ni Alloy 23518 from GE Additive or suggest local manufacture of an equivalent material at lower cost from commercially available constituent materials. In embodiments, pricing and availability information may be managed by processing, such as by an API of the platform and/or the feedstock formulation system, a set of the terms and conditions of a set of smart contracts, such as smart contracts that provide current and/or future (e.g., in a spot market at designed times in the future) pricing information, availability information (including by volume, by time and by delivery location) for various classes of feedstock materials, including by material type, material quality (e.g., where there are varying grades of the material that can be purchased as feedstock), or other properties (such as material origin (e.g., reclaimed from recycling or other sustainable sources, mined with sustainable practices, purchased from ethical sources, and the like)). In embodiments, the platform may aggregate availability information, pricing, and the like across multiple smart contracts or a blend of smart contracts and other sources (e.g., offers that are placed in the platform by data entry and/or API) to provide an aggregated feedstock availability data structure upon which the system may operate, such as where feedstock may come in lots or batches from different suppliers, places of origin, and the like. The platform may automatically generate a feedstock purchasing plan, which may include a set of current purchases, purchases of options or futures, and a plan for future purchases. In embodiments, the platform may automatically modify the feedstock purchasing plan based on changes in conditions, such as needs (e.g., where production varies relative to plan and/or demand varies relative to plan), pricing (of end products and/or materials), availability, and the like. This may occur using artificial intelligence, such as by robotic process automation trained on a training set of feedstock purchasing management data, which may use any of the machine learning or other artificial intelligence techniques described herein, including supervised, semi-supervised, and/or deep learning. The artificial intelligence system may further adjust a set of contract terms and conditions for feedstock purchasing according to the modified plan, such as by operating on a set of smart contracts via their APIs or other interfaces and/or by providing a set of recommendations for execution by a user or a hybrid of a user and an intelligent agent or other artificial intelligence system.

In embodiments, the feedstock formulation system 23506 may formulate one or more custom feedstocks with help from the machine learning system 22310, the artificial intelligence system 22312, the machine learning model 22313 for feedback formulation, the simulation management system 22614, and the feedstock formulation twin 23508. The machine learning system 22310 may train a model using feedstock data that may be stored in a feedstock datastore, such as a graph DB that organizes different feedstocks according to performance properties. The simulation management system 22614 may run simulations using the feedstock formulation twin 23508 to vary feedstock properties and to record the outcome of each simulation. In embodiments, printer twin 22606 may also be used to simulate and compare future manufacturing outcomes when varying feedstock formulation.

Referring to FIGS. 224 and 228, the feedstock formulation system 23504 works with the artificial intelligence system 22312 and the machine learning system 22310. A combination of training, manufacturing outcome, and external data such as pricing and availability information and expert and customer feedback is collected at the data collection and management system 22302, where it is used to train or improve the initial machine learning model 22313 for feedback formulation.

Referring now to FIGS. 222, 223, and 228, in embodiments, the feedstock formulation system 23506 may include a physical subsystem that is integrated with the manufacturing node 22200 and one or more of the additive manufacturing units 22202. This physical subsystem of the feedback formulation system 23504 may be managed by the autonomous additive manufacturing platform 22210. The manufacturing workflow management applications 22308 may include an application that routes feedstock material as necessary, and the data collection and management system 22302 may provide feedstock inventory levels. The feedstock formulation system 23504 may include one or more automated production and transport systems that deliver feedstock material and perform feedstock material changes for the additive manufacturing unit 22202.

Design Optimization

Optimizing part design for use with additive manufacturing processes typically requires special software, equipment, training, technical knowledge, and the ability to provide and interpret process data and manufacturing outcomes. Autonomous or guided product design can be used to improve transaction enablement platform outcomes by using pre-engineered part libraries or expert systems to provide either autonomous part design or expert-assisted designs that are optimized for metal additive manufacturing processes. Resulting workflow and process functionality may be further optimized by incorporating limitations or recommendations based on real-time analysis of transaction enablement platform entities that provide data on the availability of a selected material or 3D printer, part cost and delivery time, and so on.

Referring to FIGS. 227A, 227B, and 227C, part design optimization for 3D printing processes may be automated using the design and simulation 22216, where part function and/or class criteria are organized in a design library 22718 and used to guide or fully automate part design for manufacturing. Part functions and classes have inherent minimum design criteria imposed by standards, best practices, engineering experts, and so on. Part function examples include a self-lubricating bearing made from sintered metal that must meet chemical, mechanical, and other properties found in the ISO 5755 standard or an electrical hand tool where materials must meet 1000V electrical insulation standards found in the IEC 60900 standard. Part classification examples include parts for use in explosive atmospheres, where materials of construction must be non-sparking or parts for medical tools used in surgery, where corrosion characteristics must comply with the ASTM F1089 standard.

Referring to FIGS. 223, 224, 227, and 228, in one example embodiment, a new part request that has a specific function is received by the user interface 22212 and communicated to the design and simulation 22216, where the design libraries 22718 are searched for tested and viable 3D printed part models that match part function. In embodiments, one or more parts from the design library 22718 are recommended to the user, such as via the interface 22212, as a design recommendation or guidance. In embodiments, design libraries may also include product assemblies, wherein completed assemblies and all parts in the assembly meet functional or class criteria.

In embodiments, one or more candidate parts are automatically selected by a design optimization system 23510. With help from the machine learning system 22310 and the artificial intelligence system 22312, the design optimization system 23510 optimizes the part design and submits the same to the autonomous additive manufacturing platform 22210 for manufacturing.

In embodiments, the design optimization system 23510 may use machine learning models trained by product design experts. In embodiments, the design optimization system 23510 may use machine learning models trained using data of prior designs and their outcomes.

In embodiments, the design optimization system 23510 may use a generative or evolutionary approach to design. The system may start with design goals and then explore innumerable variations by adding constraints before selecting a final design based on evolutionary models. The evolutionary models are based on the principle of natural selection, such as where the most optimal designs are selected from among an initial population of potential designs through a series of evolutionary stages. Generative models may include models like DALL-E™ that mix visual and text-based artificial intelligence systems, as well as further hybrids for generating visual, 3D, text, color, texture, strength, flexibility, and many other properties, including using specialized artificial intelligence systems for generating variations of each of a large set of properties and generating combinations, such as pairs, triplets, and higher-order n-tuples of properties. In embodiments, generative models may generate and/or select design instance that represent combinations of properties that are shared among semantically distinct objects or topics, such as a cat and basket in order to produce and/or select a set of designs that embody the shared set of properties.

In embodiments, evolutionary models may be based on genetic algorithms (GA), evolution strategy(ES) algorithms, evolutionary programming (EP), genetic programming (GP), and other suitable evolutionary algorithms. In embodiments, the evolutionary models may use various feedback and filtering functions, such as ones based on semantic properties, ones based on design constraints (such as acceptable color palette for brand), ones based on physical or functional requirements, ones created by consumer engagement (such as surveys, engagement tracking and/or A/B testing), ones based on outcomes (such as sales, profits, or others), ones based on cost (of materials, manufacturing, logistics, or others), ones based on safety or liability, ones based on regulatory requirements or certification, and many others. In embodiments, feedback to design evolution is taken from a set of smart contracts, such as a set of smart contracts that offer various design variations for purchase, reservation, or the like. For example, a design may be evolved based on favorable smart contract engagement, such as where a particular design is reserved via the set of smart contracts at a profitable price and in favorable volumes.

In embodiments, an evolutionary design system coupled to a set of additive manufacturing units 22202 continuously offers a set of products via smart reservation contracts by which users may reserve units for manufacturing according to the offered designs, such that the capacity of the additive manufacturing system is continuously engaged in evolving the designs to provide the most favorable outcomes in the smart contracts (based on measures of profitability, for example) and selling the products to the users who reserved them via the smart contracts. Smart contract parameters, including prices, terms of delivery, and the like, may be automatically adjusted, such as to account for time to manufacture, logistics factors, and the like. The system may be configured to integrate with an e-commerce system, such as to offer products on a marketplace, an auction site, a mobile application, or the like, as well as with other environments where purchasing is enabled, such as on-site systems (kiosks), in-game transaction environments, AR/VR environments, smart displays, and many others.

Referring to FIG. 224 and FIG. 228, when manufacturing is complete, part and process data related to the outcome of the 3D printing process is collected by the data collection and management system 22302. Outcome data is provided to the machine learning system 22310 as feedback along with simulation, external, and training data to train or improve the learning model 22313.

Risk Prediction and Management

Referring now to FIG. 228, a risk prediction and management system 23512 interfaces with, links to, or integrates the artificial intelligence system 22312. In example embodiments, the risk prediction and management system 23512 may be configured to predict and manage risk or liability with respect to manufacturing, delivery, utilization and/or disposal of a part, product or other item by the distributed manufacturing network 22230, among other risks or liabilities.

In embodiments, the machine-learning system 22310 trains one or more of the models 22313 that are utilized by the artificial intelligence system 22312 to make classifications, predictions, and/or other decisions relating to risk management, including for parts and products manufactured by the distributed manufacturing network 22230 and for the systems, workflows, and other activities in which they are involved.

In example embodiments, the model 22313 may be trained to predict risk of part failure by detecting the condition of a part. The machine learning system 22310 may train the model using part data and one or more outcomes associated with the part condition, such as on a training set of data on outcomes of similar parts, similar materials, and the like, including historical data on wear-and-tear during usage, historical data on material deterioration under various ambient or environmental conditions, data on defects or faults discovered during inspection or reported by customers or others, and other data sources. Part data may include any of the attributes or parameters noted throughout this disclosure and the documents incorporated by reference herein, such as part material, part properties, manufacturing date, material supplier, part specifications, and the like. In this example, outcomes used to train the machine learning system 22310 to predict risk, including, but not limited to, failure of liability, may include projected outcomes from models, such as scientific models of various types described throughout this disclosure and the documents incorporated by reference herein (e.g., physics, chemistry, biology, materials science, and others), economic models, and many others, which, in embodiments, may be embedded into a digital twin system, such as to model whether a part twin 22604, product twin, or other twin is in a favorable operating condition during or after simulation of a set of events, a passage of time, or the like. In this example, one or more properties of the part twin 22604 are varied for different simulations and the outcomes of each simulation may be recorded. Other examples of training risk prediction and management models may include the model 22313 that is trained to optimize product safety, a model that is trained to identify parts with a high likelihood of failure, and the like.

In example embodiments, the model 22313 may be trained to predict risk of non-delivery of a product to a customer, such as due to supply chain and other disruptions, such as ones caused by various external events like equipment failures, strikes, and other labor disruptions, border control activities (such as customs inspections, travel bans, and others), limits on shipping, traffic congestion, power outages, storms and other natural disasters, catastrophes, economic disruptions (such as large changes in tariffs), regulatory changes (such as bans on import or export or changes in where products may be legally sold or used), pandemics, political unrest, and the like. In this example, a model may be trained to predict supply chain disruption by discovering, extracting, transforming, normalizing, processing, and/or analyzing data from one or more external sources like social media feeds, weather patterns, news feeds, websites (e.g., websites providing content relevant to the above, marketplace websites, research websites, and others), crowdsourcing systems (which may include posing queries or projects to crowds in order to solicit input on specific factors, such as economic factors, behavioral factors, trends, and the like), algorithms (such as ones trained to provide specific predictions of events), and many others.

Marketing and Customer Service

Referring now to FIG. 228, a marketing and customer service system 23516 interfaces with, links to, or integrates the artificial intelligence system 22312. In example embodiments, the marketing and customer service system 23516 may be configured to provide personalized sales, marketing, advertising, promotion and/or customer service with respect to a product or other item provided by the distributed manufacturing network 22230.

In embodiments, the machine-learning system 22310 trains one or more of the models 22313 that are utilized by the artificial intelligence system 22312 to make classifications, predictions, and/or other decisions relating to sales, marketing, advertising, promotion, and/or customer service for products manufactured by the distributed manufacturing network 22230.

In example embodiments, the model 22313 may be trained to predict behavior and purchase patterns of one or more customers to provide personalized sales, marketing, advertising, promotion, and/or customer service. In embodiments, the machine learning system 22310 may train the model using customer data and one or more outcomes associated with customer response to a personalized campaign, such as using various data sources that provide insight into consumer sentiment, behavior, or the like, including search engines, news sites, websites, behavioral analytic systems and algorithms, consumer sentiment measures, microeconomic measures, macroeconomic measures, and many others. A model may be seeded with various economic, behavioral, and other models, including demographic, psychological, economic, game theoretic, cognitive, and other models. Customer data may include any of the types described throughout this disclosure and the documents incorporated by reference herein, such as identity data, transactional and payment data, location data, demographic data, psychographic data, location data, wealth data, income data, sentiment data, affinity data, loyalty program data, clickstream data (including interactions with social media, applications, websites, mobile devices, AR/VR systems, video games, entertainment content, and other digital content), point-of-sale data, in-store behavioral data (such as path tracing data within stores, dwell times associated with particular types of products, and the like), brand loyalty data, shopping data, search engine data (such as search topics involving shopping), social media footprint, purchase history, loyalty program data, and many others. The customer twin 23518 may capture a set of customer responses to a marketing or advertising campaign or one or more product recommendations, offers, advertisements, or other communications by tracking outcomes like customer attention or actions (including mouse movements, mouse clicks, cursor movements, navigation actions, menu selections, and many others) measured through a software interaction observation system or purchase of a product by a customer. In this example, one or more parameters of the marketing or advertising campaign may be varied for different simulations of a customer twin and the outcomes of each simulation may be recorded.

In embodiments, the marketing and customer service system 23516 may interface with the artificial intelligence system 22312 to provide personalized sales, marketing, advertising, promotions, and/or customer service, including providing personalized marketing and advertising campaigns and providing product recommendations. In embodiments, the artificial intelligence system 22312 may utilize one or more of the machine-learned models 22313 to determine a product recommendation. In embodiments, the simulations run by the customer twin 23518 may be used to train the product recommendation machine-learning models. In each of these examples, a campaign communication, recommendation, or the like may involve a product or other item that can be manufactured by the additive manufacturing unit 22202 with a set of attributes that are tailored to the customer and that can be delivered to a designated site of the customer within a designated time frame at a proposed price. Customization of the offer/recommendation may include providing a design of a product or part to include attributes favored by the customer, including functional attributes, preferred materials (such as to match materials of products already owned by the customer), preferred colors, preferred shapes, and many others. In embodiments, customization may reference an understanding of products already owned by the customer, such as based on purchase history information, such as where a recommended product can be configured to work as part of a family of products, such as by recommending a product that has compatible color, shape, size, material type, connectivity (e.g., to work as part of a connected set of products), communication protocol, logo, or the like.

In embodiments, the additive manufacturing platform 22210, such as that associated with a transaction enablement platform network may be prepared, configured, and/or deployed to support printing of personalized entertainment props, backdrops, and other items at theme parks, cruise ships, theater and film productions, and/or other entertainment venues. For example, in connection with a cruise ship, the additive manufacturing unit 22202 may be designated to support the printing of cabins, themed rooms, or furniture to fit based on a given theme. The customers may provide their preferences in terms of room layout and design and/or furniture and accessories, which can be dynamically printed. Similarly, for theme parks, the additive manufacturing unit 22202 may be designated to support the printing of rockwork, rides, and other attractions and, for theater and film productions, movie props, costumes, sets, artifacts and other accessories may be custom printed.

In embodiments, the platform may take inputs from or related to the entertainment venue owner, such as inputs indicating the item being printed (e.g., technical specifications, CAD designs, or the like); inputs indicating requirements (such as a need to improve an existing roller coaster attraction with custom rockwork, a need to build a dinosaur replica, or the like); and inputs captured by cameras, microphones, data collectors, sensors, and other information sources associated with the entertainment venue.

In embodiments, that recommend or configure instructions for additive manufacturing, the platform 22210 may discover available materials including fabrics, metals plastics etc., configure instructions, initiate additive manufacturing, and provide updates to the owner of the entertainment venue, such as updates as to when an element will be ready to use. The platform 22210 may, in some such embodiments, automatically determine, such as by using the artificial intelligence system 22312 trained on an expert data set and the like, whether a suitable item is readily available and/or whether use of an additive manufacturing system to produce the item(s) can reduce delay to save costs or the like.

In embodiments, the platform 22210, such as through a trained AI agent, may automatically configure and schedule a set of jobs across a set of additive manufacturing units 22202 with awareness of the status of other relevant entities involved in other workflows, such as what other work is being done (e.g., to allow for appropriate sequencing of additive manufacturing outputs that align with overall workflows), the priority of the printing job (e.g., whether it relates to a film scene being shot), the cost of downtime, or other factors. In embodiments, optimization of workflows across a set of additive manufacturing entities may occur by having the artificial intelligence system 22312 undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, dye, or the like and/or finishing entities that sew, configure, add customer initials, or the like), including handoffs between sets of different manufacturing entity types, such as where handoffs are handled by robotic handling systems. In embodiments, a set of digital twins may represent attributes and capabilities of the various manufacturing systems, various handling systems (robotic systems, arms, conveyors, and the like, as well as human workforce), and/or the surrounding environment.

It will be apparent that in the above decisions related to predictions, optimizations using the artificial intelligence system 22312 of platform 22210 are only presented by way of example and should not be construed as limiting. There may be many other use cases including decisions related to prediction and optimization of pricing by a CFO twin 23520; decisions related to new product launch by a CEO twin based on behavioral patterns and market trends; and the like.

In embodiments, the autonomous additive manufacturing platform 22210 enables the distributed manufacturing network 22230 by managing the production workflows within and across one or more manufacturing nodes, thereby facilitating collaboration across the manufacturing nodes through the sharing of resources, capabilities, and intelligence. In embodiments, the manufacturing nodes may collaborate for forecasting and prediction of material supply and product demand. In embodiments, the manufacturing nodes may collaborate for design and product development. In embodiments, the manufacturing nodes may collaborate for manufacturing and assembling one or more parts of a product. In embodiments, the manufacturing nodes may collaborate for distribution and delivery of manufactured products.

The distributed manufacturing network 22230 may thus provide "manufacturing as a service" by leveraging unutilized capacity of one or more 3D printers by exposing the capacity to one or more users/designers seeking to fabricate 3D printed parts.

In embodiments, a method for facilitating the manufacture and delivery of a 3D printed product to a customer using one or more manufacturing nodes of the distributed manufacturing network 22230 includes receiving one or more product requirements from the customer; determining one or more manufacturing nodes, processes and materials based on the product requirements; generating a quote including pricing and delivery timelines; and upon acceptance of the quote by the customer, manufacturing and delivering the 3D printed product to the customer.

In embodiments, the product requirements may be a 3D printing instruction set including a file (e.g., a CAD file and/or an STL file) and any accompanying instructions for printing the product defined in the file.

In embodiments, the distributed manufacturing network may be implemented through a distributed ledger system integrated with the digital thread for storing a set of entities, activities, and transactions related to the distributed manufacturing network.

In embodiments, a smart contract system may communicate with the distributed ledger system and may be configured to implement and manage a smart contract via the distributed ledger. The smart contract may be stored in the distributed ledger and may include a triggering event. The smart contract may be configured to perform a smart contract action in response to an occurrence of the triggering event. The distributed manufacturing network may be configured to receive from a user an instance of the 3D printing instruction set. The 3D printing instruction set may be tokenized such that the instance of the 3D printing instruction set can be manipulated as a token on the distributed ledger. The tokenized 3D printing instruction set may be stored via the distributed ledger. Commitments of various parties (distributed manufacturing network entities) to the smart contract may be processed. The use of smart contracts in the distributed manufacturing network helps in automating the distributed manufacturing workflow.

In embodiments, the distributed manufacturing network facilitates the creation of a distributed manufacturing marketplace or exchange for buying and selling of additive manufacturing parts, products, and instruction sets with the manufacturing nodes constituting the sellers and customers constituting the buyers.

In embodiments, the distributed manufacturing network facilitates the creation of a data marketplace for selling of operational additive manufacturing data by manufacturing nodes to data aggregators. In embodiments, the data marketplace is built on a distributed ledger, and manufacturing nodes are compensated using digital token via smart contracts. In embodiments, the data is anonymized to hide the identity of manufacturing nodes that own the data.

FIG. 229 is a diagrammatic view of a distributed manufacturing network enabled by an autonomous additive manufacturing platform and built on a distributed ledger system according to some embodiments of the present disclosure.

The distributed manufacturing network 22230 is implemented with a distributed ledger system where the distributed ledger may be distributed at least in part over nodes of the distributed manufacturing network 22239 and may include blocks linked via cryptography. The distributed ledger system stores data related to a set of entities, activities, and transactions in the distributed manufacturing network 22230.

The different manufacturing nodes 22200, manufacturing node 22228, manufacturing node 22900, and manufacturing node 22902 each represent a node in the distributed manufacturing network 22230. Also, the different systems within a manufacturing node including the additive manufacturing unit 22202, the pre-processing system 22204, the post-processing system 22206, the material handling system 22208, the autonomous additive manufacturing platform 22210, the user interface 22212, the data sources 22214, and the design and simulation system 22216 referred to as distributed manufacturing network entities constitute distributed computing nodes of the distributed ledger system.

The distributed computing node is essentially a computing device having a processor and a computer-readable medium having machine-readable instructions stored thereon and contains full copy of the transaction history of the distributed ledger. The nodes of the distributed ledger may be implemented in a variety of computing systems including additive manufacturing systems, enterprise systems, inventory management systems, packaging systems, shipping and/or delivery tracking systems, SKU databases, smart factories, and so on. Whenever additional transactions are proposed to be added to the distributed ledger, one or more of the nodes typically validate the proposed additional transaction records, such as via a consensus algorithm. Typically, once the proposed transaction has been validated e.g., through any consensus algorithm, the proposed transaction is added to each copy of the distributed ledger across all the nodes.

In embodiments, the transaction data is validated by the nodes through a proof-of-work (POW) consensus algorithm and hashed into an ongoing chain of cryptographically approved blocks of transaction records constituting the distributed ledger.

In embodiments, proof of work algorithms require the nodes to perform a series of calculations to solve a cryptographic puzzle. For instance, in order to validate a pending data record, the nodes may be required to calculate a hash via a hash algorithm (e.g., SHA256) that satisfies certain conditions set by the system. The calculating of a hash in this manner may be referred to herein as "mining," and the nodes performing the mining may be referred to as "miners" or "miner nodes." The distributed ledger may, for example, require the value of the hash to be under a specific threshold. In such embodiments, the nodes may combine a "base string" (i.e., a combination of various types of metadata within a block header, e.g., root hashes, hashes of previous blocks, timestamps, etc.) with a "nonce" (e.g., a whole number value) to be input into the POW algorithm to produce a hash. In an exemplary embodiment, the nonce may initially be set to 0 when calculating a hash value using the POW algorithm. The nonce may then be incremented by a value of 1 and used to calculate a new hash value as necessary until a node is able to determine a nonce value that results in a hash value under a specified threshold (e.g., a requirement that the resulting hash begins with a specified number of zeros). The first node to identify a valid nonce may broadcast the solution (in this example, the nonce value) to the other nodes of the distributed ledger for validation. Once the other nodes have validated the "winning" node's solution, the pending transaction record may be appended to the last block in the distributed ledger. In some cases, a divergence in distributed ledger copies may occur if multiple nodes calculate a valid solution in a short timeframe. In such cases, the nodes using the POW algorithm accept the longest chain of blocks (i.e., the chain with the greatest proof of work) as the "true" version of the distributed ledger. Subsequently, all nodes having a divergent version of the distributed ledger may reconcile their copies of the ledger to match the true version as determined by the consensus algorithm.

In other embodiments, the consensus algorithm may be a "proof of stake" ("PoS") algorithm, in which the validation of pending transaction records depends on a user's "stake" within the distributed ledger. For example, the user's "stake" may depend on the user's stake in a digital currency or point system (e.g., a cryptocurrency, token system, asset share system, reputation point system, etc.) within the distributed ledger. The next block in the distributed ledger may then be decided by the pending transaction record that collects the greatest number of votes. A greater stake (e.g., in a given digital currency or token system) results in a greater number of votes that the user may allocate to particular pending transaction records, which in turn increases the chance for a particular user to create blocks in the distributed ledger. In embodiments, a distributed ledger need not be based on a token or cryptocurrency system, but rather may be secured by conventional or other security techniques, for example. In embodiments, such as ones involving a digital thread, proof of stake may be weighted, such as where a product manufacturer's votes, a customer's votes, or the like count more than an arbitrary third party.

In yet other embodiments, a consensus algorithm may be a "practical byzantine fault tolerance" ("PBFT") algorithm, in which each node validates pending transaction records by using a stored internal state within the node. In particular, a user or node may submit a request to post a pending transaction record to the distributed ledger. Each of the nodes in the distributed ledger may then run the PBFT algorithm using the pending transaction record and each node's internal state to come to a conclusion about the pending transaction record's validity. Upon reaching said conclusion, each node may submit a vote (e.g., "yes" or "no") to the other nodes in the distributed ledger. A consensus is reached amongst the nodes by taking into account the total number of votes submitted by the nodes. Subsequently, once a threshold number of nodes have voted "yes," the pending transaction record is treated as "valid" and is thereafter appended to the distributed ledger across all of the nodes.

In embodiments, the nodes are paid a transaction fee for their mining activities. In embodiments, the distributed ledger is a private and permissioned blockchain controlled by a single entity or a consortium of trusted entities that is built using a pre-built API provided on CORDA, Hyperledger, and Quorum.

In embodiments, the distributed ledger is a public, permissionless blockchain that is built on Ethereum or bitcoin blockchain.

In embodiments, transaction records stored in the distributed ledger may be hashed, encrypted, or otherwise protected from unauthorized access and may only be accessible utilizing a private key to decrypt the stored information/data.

The blockchain may be a single blockchain configured for storing all transactions therein, or it may comprise a plurality of blockchains, wherein each blockchain is utilized to store transaction records indicative of a particular type of transaction. For example, a first blockchain may be configured to store shipment data and transactions, and a second blockchain may be configured to store financial transactions (e.g., via a virtual currency).

In embodiments, the distributed ledger system includes a decentralized application downloadable by entities in the distributed manufacturing network.

In embodiments, the distributed ledger system includes a user interface configured to provide a set of unified views of the workflows to the set of entities of a distributed manufacturing network.

In embodiments, the distributed ledger system includes a user interface configured to provide tracking and reporting on state and movement of a product from order through manufacture and assembly to final delivery to the customer.

In embodiments, the distributed ledger system includes a system for digital rights management of entities in the distributed manufacturing network. In embodiments, the distributed ledger system stores digital fingerprinting information of documents/files and other information including creation, modification, and the like.

In embodiments, the distributed ledger system includes a cryptocurrency token to incentivize value creation and transfer value between entities in the distributed manufacturing network.

In embodiments, the distributed ledger system includes a system for attesting the experience of a manufacturing node.

In embodiments, the distributed ledger system includes a system for capturing the end-to-end traceability of a part.

In embodiments, the distributed ledger system includes a system for tracking all transactions, modifications, quality checks, and certifications on the distributed ledger.

In embodiments, the distributed ledger system includes a system for validating capabilities of a manufacturing node.

In embodiments, the distributed ledger system includes smart contracts for automating and managing the workflows in the distributed manufacturing network.

In embodiments, the distributed ledger system includes a smart contract for executing a purchase order covering the scope of work, quotation, timelines, and payment terms.

In embodiments, the distributed ledger system includes a smart contract for processing of payment by a customer upon delivery of product.

In embodiments, the distributed ledger system includes a smart contract for processing insurance claims for a defective product.

In embodiments, the distributed ledger system includes a smart contract for processing warranty claims.

In embodiments, the distributed ledger system includes a smart contract for automated execution and payment for maintenance.

FIG. 230 is a schematic illustrating an example implementation of a distributed manufacturing network where the digital thread data is tokenized and stored in a distributed ledger so as to ensure traceability of parts printed at one or more manufacturing nodes in the network according to some embodiments of the present disclosure. A user of the distributed manufacturing network 22230 may provide the product requirements in the form of a purchase order or a 3D printing instruction set 23002. The 3D printing instruction set 23002 contains key specifications and requirements like product design, material for printing, quantity to be printed, price that the user is willing to pay for the print, and the timelines for completing the printing. The 3D printing instruction set 23002 may also include one or more files (e.g., a CAD file and/or an STL file) and any accompanying instructions for printing the product defined in the file.

Upon receipt, the 3D printing instruction set 23002 is tokenized and stored in the distributed ledger 22724 in the autonomous additive manufacturing platform 22210. The underlying information in the 3D printing instruction set 23002 is stored in the form of a unique record represented by a block number with an address on the distributed ledger, which in turn is represented by a cryptographic token. The cryptographic token captures the value of the underlying information in the 3D printing instruction set 23002 as ownership or access rights to the distributed ledger address and tracks the transfer of such ownership between users of the distributed manufacturing network 22230. For example, in FIG. 230, the 3D printing instruction set 23002 is tokenized in the form of a random 22356 bit integer A091BC3, and stored in the distributed ledger 22724 represented by address BC22. As the new block is added to the distributed ledger 22724 at node 22228, all the copies stored at various nodes, including the manufacturing node 22200, the manufacturing node 22900, and the manufacturing node 22902, get updated with the new block. The matching system 22732 in the autonomous additive manufacturing platform 22210 may help with matching the purchase order or the 3D printing instruction set 23002 with one or more manufacturing nodes or 3D printers. The matching may be based on factors like printer capabilities, locations of the customer and the manufacturing nodes, available capacity at each node, pricing, and timelines requirements. In embodiments, a smart contract operates on the ledger, such as to trigger conditional logic embodied in the smart contract, such as tracking satisfaction of delivery obligations, releasing insurance obligations (such as insurance covering products during shipment), and the like. In embodiments, the smart contract may allocate financial value, such as to tax and customs authorities, to credit and debit card issuers, to distributers and resellers, to recipients of commissions, to recipients of royalties, to recipients of rebates, credits and the like, to shippers/carriers, and to the manufacturer, among others.

In embodiments, the matching system 22732 may determine that the parts 23004 and 23010 of the product be matched to the manufacturing node 22200 for printing, parts 23006 and 23008 matched to the manufacturing node 22228, and parts 23012 and 23014 matched to the manufacturing node 22902. The assembly of all the parts into the final product may be matched to the manufacturing node 22900.

Each of the parts may also be tokenized to capture information including purchase order identifier (orderID), instruction set identifier (fileID), manufacturing node (manufacturerID), 3D printer (printerID), part number (partID), and part specifications containing information like material and quantity etc. and stored as a record or block in the distributed ledger. The parts can then be tracked using a physical tracker using a unique part number, engraving, RFID tag, bar code or smart label linked to the block and unique to the token. In a similar manner, the product assembled from all the parts may also be tokenized and tracked as it moves through the distributed manufacturing network 22230 and through various entities 22226 to the customer.

In embodiments, tokenizing the part, product, or 3D printed instruction set may include wrapping access, intellectual property, licensing, ownership, financial, time-sharing, leasing, rental, usage sharing and/or other suitable rights related to the part, product, or instruction set into a token such that the access, licensing, ownership, and/or other suitable rights are managed by one or more of the tokens.

In embodiments, the distributed manufacturing network 22230 may define permissions and/or operations associated with the tokens. For example, the token may allow the tokenized 3D printed instruction set to be viewed, edited, copied, bought, sold, and/or licensed based on permissions set at a time of tokenization by the distributed manufacturing network 22230. In embodiments, the distributed manufacturing network 22230 may provide for orchestration of a distributed manufacturing marketplace or exchange, such as where 3D printed instruction sets may be exchanged, such as, without limitation, through tokens that are optionally governed by smart contracts that may be configured by a host of the distributed manufacturing exchange or marketplace and/or by manufacturing nodes. For example, an exchange or marketplace may host exchanges for tokenized 3D printed instruction sets, parts, products, expertise, trade secrets, insight, where transaction terms are pre-defined and/or configurable (such as with configurable smart contracts that enable various transaction models, including bid/ask models, auction models, donation models, reverse auction models, fixed price models, variable price models, contingent pricing models and others), where metadata is collected and/or represented about categories of distributed manufacturing marketplace or exchange, and where relevant content is presented, including market pricing data, substantive content about additive manufacturing, content about providers, and the like. Such an exchange may facilitate monetization of tokenized 3D printed instruction set knowledge represented in tokens.

In embodiments, a distributed manufacturing marketplace as described herein may be integrated with or within another exchange, such as a domain-specific exchange, a geography-specific exchange, or the like, where the distributed manufacturing marketplace may be configured to address the subject matter of the other exchange, such as: to account for changes in the other exchange in the models and algorithms used in the distributed manufacturing marketplace (e.g., pricing models, predictive models, control systems, and others) to the extent that they impact supply, demand, pricing, volumes, operational factors, and other factors; to provide via distributed manufacturing units a set of items and/or a set of data that may be used by the other exchange (such as by providing products that can be exchanged in the other exchange, by providing data sets, analytic measures, or the like that may inform the operation of the other exchange and the like); to provide for resource sharing between the distributed manufacturing marketplace and the other exchange (such as to enable shared computation, shared data storage, shared network resources, shared security resources, shared physical location, and the like); and/or to provide for integrated coordination of the distributed manufacturing marketplace and the other exchange. Shared resource utilization may include embedding a set of services of the other exchange in one or more additive manufacturing units, such as to render it a hybrid of an additive manufacturing unit and a unit enabling another exchange. The other exchange may be a product exchange (such as an e-commerce marketplace, an auction marketplace, or the like), a stock exchange, a commodities exchange, a derivatives exchange, a futures exchange, an advertising exchange, an energy exchange, a renewable energy credits exchange, a knowledge exchange, a cryptocurrency exchange, a bonds exchange, a currency exchange, a precious metals exchange, a petroleum exchange, an exchange for goods, an exchange for services, an exchange for legal rights (such as intellectual property, real property, likeness, publicity rights, privacy rights, or others), or any of a wide variety of others. This may include integration by APIs, connectors, ports, brokers, and other interfaces, as well as integration by extraction, transformation and loading (ETL) technologies, smart contracts, wrappers, containers, or other capabilities.

In embodiments, the digital twin system 22314 may be configured to present a simulation of a marketplace, an exchange, a product, a seller, a buyer, a transaction, or a combination thereof via a marketplace digital twin. The digital twin or replica may be a two-dimensional or three-dimensional simulation of a marketplace, an exchange, a product, a seller, a buyer, a transaction, and the like. The digital twin may be viewable on a computer monitor, a television screen, a three-dimensional display, a virtual-reality display and/or headset, an augmented reality display such as AR goggles or glasses, and the like. The digital twin may be configured to be manipulated by one or more users of the autonomous additive manufacturing platform 22210. Manipulation by a user may allow the user to view one or more portions of the digital twin in greater or lesser detail. In embodiments, the digital twin system 22314 may be configured such that the digital twin may simulate one or more potential future states of a marketplace, an exchange, a product, a seller, a buyer, a transaction, etc. The digital twin may simulate the one or more potential future states of a marketplace, an exchange, a product, a seller, a buyer, a transaction, etc. based on simulation parameters provided by the user. Examples of simulation parameters include a progression of a period of time, potential actions by parties such as buyers or sellers, increases in supply and/or demand of products, resources, etc., changes in government regulations, and any other suitable parameters.

In embodiments, the autonomous additive manufacturing platform 22210 may implement gamification in the distributed manufacturing network 22230 by awarding points to various entities for performing tasks desirable to operation of the distributed manufacturing network 22230. For example, points may be awarded for trading parts or products of a particular type and/or within a particular region. Entities who have been awarded points may compete with one another, and digital and/or physical prizes may be awarded to entities who have achieved one or more point thresholds and/or have ranked above one or more other entities on a points leaderboard.

In embodiments, the scoring system 22734 can rate the one or more manufacturing nodes or 3D printers in the distributed manufacturing network 22230 based on a customer satisfaction score for meeting customer requirements. In embodiments, the score may form another basis for matching customers to manufacturing nodes or 3D printers.

In embodiments, the scoring system 22734 crowdsources the customer satisfaction score from multiple entities in the distributed manufacturing network 22230. Examples of crowd sources include certifying entities, domain experts, customers, manufacturers, wholesalers, and any other suitable party.

In embodiments, certifying entities or domain experts may certify one or more 3D printed parts as being good quality, accurate, and/or reliable. In embodiments, customers may review and certify one or more 3D printed parts or products, such as to indicate that the part or product is in working order and/or of expected quality. In embodiments, manufacturers and/or wholesalers may sign an instance of 3D printed instruction set, such as by applying a serial number to a piece of a 3D printed instruction set before it is transmittable to a customer. Certifications, reviews, signatures, and/or any other validation indicia made by crowd sources may be recorded in the distributed ledger, such as by adding one or more new blocks to the distributed ledger that indicate the certification, review, signature, or other validation indicia.

In embodiments, the autonomous additive manufacturing platform 22210 utilizes a system for learning on a training set of outcomes, parameters, and data collected from data sources associated with the distributed manufacturing network 22230 to train models in the artificial intelligence system 22312 to predict and manage product demand from one or more customers of the distributed manufacturing network 22230.

In embodiments, the autonomous additive manufacturing platform 22210 utilizes a system for learning on a training set of outcomes, parameters, and data collected from data sources associated with the distributed manufacturing network 22230 to train models in the artificial intelligence system 22312 to predict and manage material supply.

In embodiments, the autonomous additive manufacturing platform 22210 utilizes a system for learning on a training set of outcomes, parameters, and data collected from data sources associated with the distributed manufacturing network 22230 to train models in the artificial intelligence system 22312 to optimize production capacity for a distributed manufacturing network enabled by the autonomous additive manufacturing platform.

In embodiments, the autonomous additive manufacturing platform 22210 utilizes a system for learning on a training set of outcomes, parameters, and data collected from data sources associated with the distributed manufacturing network 22230 to train models in the artificial intelligence system 22312 to schedule across multiple production processes, printers, manufacturing nodes, and to recalibrate schedules dynamically based on changes in real-time production and priority data.

In embodiments, the autonomous additive manufacturing platform 22210 may utilize a distributed ledger to manage a set of permission keys that provide access to one or more instances of the 3D printing instruction set 23002 and/or services associated with the distributed manufacturing network 22230.

In embodiments, the distributed ledger provides provable access to the 3D printing instruction set 23002, such as by one or more cryptographic proofs and/or techniques.

In embodiments, the distributed ledger may provide provable access to the 3D printing instruction set 23002 by one or more zero-knowledge proof techniques.

In embodiments, the autonomous additive manufacturing platform 22210 may manage the distributed ledger to facilitate cooperation and/or collaboration between two or more entities with regard to one or more instances of the 3D printing instruction set 23002.

In embodiments, a trusted authority (e.g., the autonomous additive manufacturing platform 22210 or another suitable authority) may issue private key and public key pairs to each registered user of the distributed manufacturing network 22230. The private key and public key pairs may be used to encrypt and decrypt data (e.g., messages, files, documents, etc.) and/or to perform operations with respect to the distributed ledger.

In embodiments, the autonomous additive manufacturing platform 22210 or another suitable authority may provide two or more levels of access to users.

In embodiments, the autonomous additive manufacturing platform 22210 may define one or more classes of users, where each of the classes of users is granted a respective level of access.

In embodiments, the autonomous additive manufacturing platform 22210 may issue one or more access keys to one or more classes of users, where the one or more access keys each correspond to a respective level of access, thereby providing users of different levels of access via their respective issued access keys.

In embodiments, possession of certain access keys may be used to determine a level of access to the distributed ledger. For example, a first class of users may be granted full viewing access of a block, while a second class of users may be granted both viewing access of blocks and an ability to verify and/or certify one or more instances of transactions contained within a block, and a third class of users may be granted viewing access of blocks, an ability to verify and/or certify one or more instances of transactions contained within a block, and an ability to modify the one or more instances of transactions contained within the block. In some embodiments, a class of users may be verified as being a legitimate user of the distributed ledger in one or more roles and allowed related permissions with respect to the distributed ledger and content stored therein.

In embodiments, the distributed manufacturing network 22230 may establish a whitelist of trusted parties and/or devices, a blacklist of untrusted parties and/or devices, or a combination thereof for managing access.

In embodiments, the additive manufacturing platform 22210 may be configured to create customized products for shoppers (i.e., customers) in or traveling to a retail environment. The customized products may be printed at the retail environment by the additive manufacturing unit 22202, thereby attracting customers to the retail environment. The customized products may include one or both of ornamental designs and functional designs. The ornamental designs may be configured to have one or more aesthetic elements that are customized according to a profile of the customer. The functional designs may be configured to have one or more functional features that are customized according to a profile of the customer. For example, the additive manufacturing platform may use customer profile information such as location data and/or search data to determine that a customer will be visiting the retail environment. Upon determining that the customer will be visiting the retail environment, the additive manufacturing platform may use information indicative of aesthetic and/or functional desires of the customer to design a customized product for the customer. The additive manufacturing unit 22202 may manufacture the customized product such that the customized product may be purchased by the customer from the retail environment. The customized product may be a product customized to fit the physiology of the customer. For example, the customized product may be a case for a cellular phone designed to fit a hand of the customer based on data related to the shape and/or size of the hand of the customer.

In embodiments, the additive manufacturing platform 22210 may be configured to create product samples tailored to shoppers. The additive manufacturing platform 22210 may use data from the customer profile to determine one or more types of product samples that may appeal to the customer. The additive manufacturing unit 22202 may print the product samples that appeal to the customer prior to and/or during visitation to the retail environment by the customer. The product samples may include, for example, material samples, fabric samples, food samples, or any other suitable type of product sample.

In embodiments, the additive manufacturing platform 22210 may be configured to use images, text, and/or videos related to the customer to build the customer profile. The images, text, and/or videos may be sourced from one or more of web crawlers, social media feeds, public databases, and the like.

In embodiments, the additive manufacturing platform 22210 may include the AI system 22312 configured to perform AI and/or machine learning tasks related to functions of the additive manufacturing platform. The AI system 22312 may be configured to at least partially design the customized products for shoppers. The AI system 22312 may use one or more machine learned models 22313 to analyze the customer profile and determine one or more customized products or features thereof that would be desirable to the customer. The AI system 22312 may use one or more machine learned models 22313 to analyze sources of images, text, and/or videos to build the customer profile. The machine learned models 22313 may be configured to allow the AI system 22312 to determine types of images, text, and/or videos that are more or less valuable and/or effective to build the customer profile. The AI system 22312 may use one or more machine learned models 22313 to determine types of custom designs that may be more or less desirable to the customer.

In embodiments, the additive manufacturing platform 22210 may be configured to produce out-of-stock and/or low-stock products on-site at the retail environment. The platform may receive data related to amounts of stock of products of the retail environment. The platform may determine that one or more products are out of stock and/or may become out of stock. The AI system 22312 may be configured to determine the out of stock products. Upon determining that one or more products are out of stock and/or may become out of stock, the platform may, by using the additive manufacturing unit 22202, produce more of the products.

In embodiments, the additive manufacturing platform 22210 may be configured to produce infrastructure for the retail environment. The infrastructure may be new infrastructure and/or replacement infrastructure. The infrastructure may be produced via the additive manufacturing unit 22202. Examples of infrastructure include pallets, storage racks, display environments, signs, packages, tags, escalator parts, elevator parts, and the like. The additive manufacturing platform 22210 may be configured to automatically determine infrastructure needs of the retail environment. The AI system 22312 may be configured to use a machine learned model to determine and/or predict infrastructure needs of the retail environment.

In embodiments, the additive manufacturing platform may be configured to create customized products for shoppers (i.e., customers) in or traveling to a retail environment. The customized products may be printed at the retail environment by a 3D printing device, thereby attracting customers to the retail environment. The customized products may include one or both of ornamental designs and functional designs. The ornamental designs may be configured to have one or more aesthetic elements that are customized according to a profile of the customer. The functional designs may be configured to have one or more functional features that are customized according to a profile of the customer. For example, the additive manufacturing platform may use customer profile information such as location data and/or search data to determine that a customer will be visiting the retail environment. Upon determining that the customer will be visiting the retail environment, the additive manufacturing platform may use information indicative of aesthetic and/or functional desires of the customer to design a customized product for the customer. The 3D printing device may manufacture the customized product such that the customized product may be purchased by the customer from the retail environment. The customized product may be a product customized to fit the physiology of the customer. For example, the customized product may be a case for a cellular phone designed to fit a hand of the customer based on data related to the shape and/or size of the hand of the customer.

In embodiments, the additive manufacturing platform may be configured to create product samples tailored to shoppers. The additive manufacturing platform may use data from the customer profile to determine one or more types of product samples that may appeal to the customer. The 3D printing device may print the product samples that appeal to the customer prior to and/or during visitation to the retail environment by the customer. The product samples may include, for example, material samples, fabric samples, food samples, or any other suitable type of product sample.

In embodiments, the additive manufacturing platform may be configured to use images, text, audio, and/or videos related to the customer to build the customer profile. The images, text, audio, and/or videos may be sourced from one or more of web crawlers, social media feeds, public databases, and the like.

In embodiments, the additive manufacturing platform may include an AI system configured to perform AI and/or machine learning tasks related to functions of the additive manufacturing platform. The AI system may be configured to at least partially design the customized products for shoppers. The AI system may use one or more machine learned models to analyze the customer profile and determine one or more customized products or features thereof that would be desirable to the customer. The AI system may use one or more machine learned models to analyze sources of images, text, and/or videos to build the customer profile. The machine learned models may be configured to allow the AI system to determine types of images, text, and/or videos that are more or less valuable and/or effective to build the customer profile. The AI system may use one or more machine learned models to determine types of custom designs that may be more or less desirable to the customer.

In embodiments, the additive manufacturing platform may be configured to produce out-of-stock and/or low-stock products on-site at the retail environment. The platform may receive data related to amounts of stock of products of the retail environment. The platform may determine that one or more products are out of stock and/or may become out of stock. The AI system may be configured to determine restocking needs. Upon determining that one or more products are out of stock and/or may become out of stock, the platform may, by the 3D printing device, produce more of the products.

In embodiments, the additive manufacturing platform may be configured to produce infrastructure for the retail environment. The infrastructure may be new infrastructure and/or replacement infrastructure. The infrastructure may be produced via the 3D printing device. Examples of infrastructure include pallets, storage racks, display environments, signs, packages, tags, escalator parts, elevator parts, and the like. The additive manufacturing platform may be configured to automatically determine infrastructure needs of the retail environment. The AI system may be configured to use a machine learned model to determine and/or predict infrastructure needs of the retail environment.

In embodiments, an additive manufacturing platform 22210, such as that associated with a transaction enablement platform or other network, may be designed, prepared, configured, and/or deployed to support the design, development, manufacture, and distribution of health and medical devices, components, parts, equipment, and the like. For example, in connection with a patient consultation with a medical or health services provider, an additive manufacturing unit may be designated to support the consultation, such as a mobile additive manufacturing unit 22202 and/or a unit located in sufficiently close proximity to the medical or health services provider to facilitate rapid delivery of medical and healthcare hard goods and devices produced by the additive manufacturing unit 22202.

Based on the nature of the healthcare consultation (e.g., medical specialty and its corresponding devices, equipment and parts), the additive manufacturing unit 22202 may be equipped with appropriate materials, such as a combination of metal and/or plastic printing materials, or other printing materials, that are suitable to print a range of possible health and medical devices, components, parts, equipment and the like to support healthcare providers and their patients.

In embodiments, the platform 22210 may take inputs from or related to a healthcare consultation, such as inputs indicating a needed medical device or part (e.g., technical specifications, CAD designs, and the like); inputs indicating patient-specific data (e.g., clinical criteria, measurements such as sizing, weight, height, girth, circumference, or the like); and inputs provided by medical and health service providers or other third parties, such as device specifications, requirements, and the like (e.g., limitations on device size, such as thickness, requirements related to load- or stress-bearing minimums, or some other criterion).

In embodiments, the platform 22210 may process the inputs from a plurality of sources including, but not limited to, medical records (e.g., patient measurements, material allergies, use of other related medical devices, and the like), device specification data (e.g., manufacturing specifications from the party (ies) holding rights to the device, part, or other object to be manufactured), patient-input data (e.g., aesthetic preferences such as color of the device), healthcare-provider-input data (e.g., medical office branding), or some other input. An artificial intelligence system (such as a robotic process automation system trained on a training set of expert medical devices or other data) may, in some embodiments, determine a recommended action, prototype, device, which in embodiments may involve production of a device and/or a component of a device. The additive manufacturing platform 22210 may, in some such embodiments, automatically determine (such as using an artificial intelligence system, such as robotic process automation trained on an expert data set) whether a medical device is readily available from a manufacturer (including a device that is currently in stock and/or on order) and/or whether an additive manufacturing system should produce the device, such as to meet an immediate patient need, to save costs, or the like. Similarly, the additive manufacturing platform may, in some embodiments, using similar systems, automatically determine that an element should be additively manufactured to facilitate repair, such as where a complementary component may be generated to replace a worn or absent element of a medical device.

In an example embodiment, an outpatient may visit an orthopedic office for a healthcare consultation relating to a knee injury. Given the probability that the patient will require some form of external knee support from a medical device, such as a brace, an attending physician in advance of the healthcare consultation may access a user interface, dashboard, or some other user portal to the additive manufacturing platform to determine the availability of knee braces and other medical devices to be manufactured by the additive manufacturing platform (e.g., to confirm that the additive manufacturing platform 22210 has available designs, CAD renderings and/or other specifications that will enable it to produce the needed medical device). If the additive manufacturing platform 22210 has such device specifications, the attending physician (or other personnel associated with the upcoming patient healthcare consultation) may place would-be wanted device designs in a queue hold, reserve, or some other means of recording potential interest in their manufacture. By having such recording, upon meeting with the patient, the attending physician (or other personnel associated with the upcoming patient healthcare consultation) may be able to present device options to the patient to select from using the user interface, dashboard, or some other user portal to the additive manufacturing platform. If a needed medical device is not currently associated with the additive manufacturing platform, this may cause the platform to automatically send out a request for corresponding device specifications, design, and other data that are needed to manufacture the device, component, or part. Once such corresponding device specifications, design, and other data are located, an alert may be provided back to the attending physician (or other personnel associated with the upcoming patient healthcare consultation) indicating that there are proposed products/devices for review that appear to conform with the listed device requirements. As part of the review of each available specification, design, or other data that is needed to manufacture the device, contract terms relating to costs, warranty, and other considerations may be presented for review. Contract terms and contractual relationships between users of the additive manufacturing platform and third party holders of rights related to device manufacturing may be coordinated using smart contracts, as described herein. Before, during, or after the patient's healthcare consultation, a medical device design may be selected and input for manufacture to the additive manufacturing platform. As part of the order, data relating to the specific patient may be submitted to the additive manufacturing platform, such as data regarding the circumference of the patients lower-leg, knee, and upper-leg that are needed to make an appropriately sized brace. Such information may be manually input to the additive manufacturing platform or may be automatically input to the additive manufacturing platform by transfer of data from a data source external to the additive manufacturing platform 22210, such as an electronic medical record, or some other data source storing data that is relevant to the device characteristics. Additional, preferential data may also be provided, such as a child wanting images of koala bears engraved in the exterior of their brace or a businessperson wanting the brace to be a particular color to better match her skin tone and/or business suit color to make the brace less apparent. The user interface, dashboard, or some other user portal to the additive manufacturing platform may enable interaction with the additive manufacturing platform that allows a user, like a patient, to see different prototypes and aesthetic flourishes of the to-be manufactured device prior to submitting a job to be built. Upon finalizing the design specifications, the additive manufacturing platform 22210 may proceed with producing the device and/or a component or part of the device, while the patient's healthcare consultation proceeds, or, this manufacture may be finalized following the consultation, and the device automatically sent to the patient and/or healthcare provider based on contact data input to the additive manufacturing platform 22210 at the time of placing the order.

In embodiments, the additive manufacturing platform 22210, such as that associated with a transaction enablement platform network, may be prepared, configured, and/or deployed to support printing of customized and/or personalized hotel textiles for a set of hotel guests. In one example, in connection with an upcoming hotel guest visit, the additive manufacturing unit 22202 may be designated for support, such as a mobile additive manufacturing unit 22202 and/or a unit located in sufficiently close proximity to the hotel to facilitate rapid delivery of items produced by the additive manufacturing unit 22202. In embodiments, textiles that may be customized and/or personalized may include bedding, sheets, towels, robes, pillows, blankets, curtains, furniture, and the like.

In embodiments, the additive manufacturing unit 22202 may be equipped with appropriate materials, such as a combination of fabrics and other printing materials, that are suitable to print a range of possible textiles or other elements to support the hotel visit. In embodiments, fabrics may include, but are not limited to, canvas, cashmere, chenille, chiffon, cotton, crepe, damask, georgette, gingham, jersey, lace, leather, linen, merino wool, modal, muslin, organza, polyester, satin, silk, spandex, suede, taffeta, toile, tweed, twill, velvet, viscose, and many others.

In embodiments, the additive manufacturing platform 22210 may take inputs related to the upcoming hotel visit, such as inputs indicating the type(s) of item to print (e.g., pillows, bedding, towels, and the like); inputs indicating fabric type (such as cotton, silk, or the like); inputs indicating item size (such as to fit a queen bed or king bed); and inputs captured by cameras, microphones, data collectors, sensors, and other information sources associated with the upcoming hotel visit. For example, a hotel employee may capture information related to hotel guest preferences. In embodiments, the additive manufacturing platform 22210 may process the inputs, such as using the artificial intelligence system 22312 (such as a robotic process automation system trained on a training set of expert service visit data), to determine a recommended action, which in embodiments may involve printing of a textile. The additive manufacturing platform 22210 may, in some such embodiments, automatically determine (such as using an artificial intelligence system 22312, such as robotic process automation trained on an expert data set) whether the additive manufacturing unit 22202 should produce the textile.

In any such embodiment that recommends or configures instructions for additive manufacturing, the additive manufacturing platform 22210 may discover available materials/fabrics, configure instructions, initiate additive manufacturing, and provide updates to a hotel employee, such as updates as to when an element will be ready to use.

In embodiments, the additive manufacturing platform 22210, such as through a trained AI agent, may automatically configure and schedule a set of jobs across a set of additive manufacturing units 22202 with awareness of the status of other relevant entities involved in other workflows, such as what other work is being done (e.g., to allow for appropriate sequencing of additive manufacturing outputs that align with overall workflows), the priority of the printing job (e.g., whether it relates to a loyal hotel guest), or other factors. In embodiments, optimization of workflows across a set of additive manufacturing entities may occur by having the artificial intelligence system 22312 undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, dye, or the like and/or finishing entities that sew, configure, add hotel guest initials, or the like), including handoffs between sets of different manufacturing entity types, such as where handoffs are handled by robotic handling systems. In embodiments, a set of digital twins may represent attributes and capabilities of the various manufacturing systems, various handling systems (robotic systems, arms, conveyors, and the like, as well as human workforce), and/or the surrounding environment (such as a hotel, a manufacturing facility, or the like).

In embodiments, the additive manufacturing platform 22210 such as that associated with a transaction enablement platform network may be prepared, configured, and/or deployed to support restaurant operations. For example, in connection with a customer reservation at a restaurant, the additive manufacturing unit 22202 may be designated to support the customer reservation, such as a table-side additive manufacturing unit 22202 and/or a portable unit to facilitate direct-to-table delivery of items produced by the additive manufacturing unit 22202.

Based on the nature of the reservation (e.g., special dietary requirements, accessibility requirements, occasion of the reservation) and the services and supplies available at the restaurant, the additive manufacturing unit 22202 may be equipped with appropriate materials, such as a combination of food grade service/storage materials and other printing materials, that are suitable to print range of possible service items, specialized flatware, customized commemorative/celebration items, or other elements to support the reservation. In embodiments, the additive manufacturing platform 22210 may take inputs from or related to the reservation, such as inputs indicating time of day, size of the party, special requests, affiliation with principals of the restaurant, loyalty participation, and the like; inputs indicating service support capabilities at the restaurant and options for timely access to locally available service support material/equipment (such as a status of ovens, cook tops, food storage, meal prep material, customizable service items, or the like); and inputs captured by cameras, microphones, data collectors, sensors, and other information sources associated with the reservation, including select input capture device(s) associated with one or more participants in the reservation (e.g., a personal mobile phone with image capture features). For example, a hostess station camera may capture a set of photos of the participants, such as images of the reservation participant(s) faces that are suitable for generation of a 3D data set for additive manufacturing printing use.

In embodiments, the additive manufacturing platform 22210 may process the inputs, such as by using the artificial intelligence system 22312, to determine a recommended action for servicing participants in the reservation, which in embodiments may involve use of a service item, such as a standard service item adapted to meet a service requirement of the reservation, such as a customized serving tray with separated compartments for each participant in the reservation, an item of flatware and/or serving spoon adapted for use by a person without a normal appendage, and the like. The additive manufacturing platform 22210 may, in some such embodiments, automatically determine, such as by using the artificial intelligence system 22312 trained on an expert data set and the like, whether a suitable service item is readily available and/or whether use of an additive manufacturing system to produce the service item(s) can reduce delay to save costs or the like. Similarly, the additive manufacturing platform 22210 may, in some embodiments, using similar systems, automatically determine that an element should be additively manufactured to facilitate use of additional kitchen equipment, such as cook tops to ensure timely meal service for the reservation, such as where a complementary component may be generated to replace a worn or absent component, such as a gas setting knob on a gas range regulator.

In embodiments, automatic determination may occur using a machine vision system that captures a set of facial images of reservation participants and produces an instruction set for additively manufacturing a complementary service item, such as a drinking glass that matches the facial image. In any such embodiment that recommends or configures instructions for additive manufacturing, the additive manufacturing platform 22210 may discover available additive manufacturing units 22202 (e.g., a drinking glass additive manufacturing unit on the restaurant premises), configure compatible instructions, initiate additive manufacturing, and provide updates to the service staff, such as updates as to when the custom printed drinking glass will be ready to use. In embodiments, the additive manufacturing platform 22210, such as through a trained AI agent, may automatically configure and schedule a set of jobs across a set of additive manufacturing units 22202 (drinking glass additive manufacturing units, kitchen equipment parts additive manufacturing units, takeaway/takeout food storage systems additive manufacturing units, and the like) with awareness of the status of other relevant reservations at the restaurant and other kitchens/service workflows, such as the timing of food preparation/meal courses (e.g., to allow de-prioritization of additive manufacturing jobs that are to produce reservation-related service items that won't be used immediately upon the start of the reservation), what other additive manufacturing work is being done for other reservations (e.g., to allow for appropriate sequencing of additive manufacturing outputs that align with overall kitchen workflows, meal service, and the like), the cost (both direct and indirect) of delays in additive manufacturing element access (e.g., poor reviews, discounted charges, lower service tip, free food/beverage items as compensation for delays, and the like), or other factors.

In embodiments, restaurant service items that may be enhanced and/or produce through additive manufacturing techniques include, without limitation, takeout/away containers constructed to meet individual food item needs, such as keeping salad cool, keeping a hot meal warm, or keeping a serving of French fries crispy, containers shaped to meet food service item size/shape (e.g., a triangle sized container for a slice of pie, round for a pancake, oblong/square for a sandwich item), and the like. In embodiments, user-specific flatware, such as age range-specific flatware suitable for use by a baby just learning to use a fork and spoon or a child honing her skill with a knife, an unconventional flatware item based on user preferences (explicitly expressed in association with the reservation or implicitly derived from user context/imagery), and the like. Further in embodiments, table and service items, such as mugs, coasters, chargers, plates, and the like may be produced to meet reservation aspects, such as a logo supplied with the reservation, an occasion-specific design/embellishment recommended during the reservation process, and the like. In embodiments, optimization of workflows across a set of additive manufacturing entities/units may occur by having an artificial intelligence system undertake a set of simulations, such as simulations involving alternative food preparation and/or reservation sequences, design configurations, alternative output/material types, and the like.

In embodiments, reservation service items that rely on a mix of additive manufacturing materials, such as paper-like material and thermal insulation structures, may provide performance benefits over single-material items, such as lower thermal transfer from an interior of a service item (e.g., a custom printed drinking glass) to an exterior of the item (e.g., for maintaining the interior temperature and improving comfort of a user holding the glass).

In embodiments, the additive manufacturing platform 22210, such as that associated with a transaction enablement platform network, may be prepared, configured, and/or deployed to support printing of personalized food at campuses in universities and/or enterprises. In one example, an additive manufacturing unit 22202 may be designated to provide ethnic and personalized food to students and workers on the go. In embodiments, the additive manufacturing unit 22202 may be equipped with materials, such as a combination of ingredients and other printing materials, that are suitable to print a range of possible food items to support the students or workers. For example, pizza making may be automated by the additive manufacturing unit 22202 and a multi-nozzle print head may deposit dough, sauce, and cheese along with personalized choice of pizza toppings. Similarly, desserts, chocolates, cakes, pastries, even edible plates, utensils and cutlery, and the like may be printed by the additive manufacturing unit 22202.

In embodiments, the additive manufacturing platform 22210 may take inputs from or related to the customer, such as inputs indicating the type(s) of food items to print (e.g., pizza, pasta, desserts, and the like); inputs indicating taste preferences (such as spicy, sweet, or the like); inputs indicating aesthetic preferences (such as texture, color, or the like); inputs indicating food item size (such as small, medium, or large); inputs indicating nutritional requirements (proteins, carbohydrates, fats, vitamins, minerals etc.) inputs indicating health needs (such as allergies or the like); inputs captured by cameras, microphones, data collectors, sensors, and other information sources associated with the upcoming campus visit; or some other input type. For example, information related to customer biological information may be captured to determine that the customer does not have any seafood allergies. In embodiments, the additive manufacturing platform 22210 may process the inputs, such as using the artificial intelligence system 22312 (such as a robotic process automation system trained on a training set of expert service visit data), to determine a recommended action, which, in embodiments, may involve printing of, for example, a custom sushi that optimizes ingredients that fulfill the nutritional requirements of the customer.

In embodiments, the additive manufacturing unit 22202 may print takeout containers to meet individual food item needs, such as keeping salad cool, keeping a hot meal warm, keeping a serving of French fries crispy, containers shaped to meet food service item size/shape, and the like.

In embodiments, the food items may be printed at a mobile additive manufacturing unit 22202 near or at the point of use on an on-demand basis thereby reducing food inventory and the cost involved with storage and transportation.

In embodiments, the additive manufacturing platform 22210, such as through a trained AI agent, may automatically configure and schedule a set of jobs across a set of additive manufacturing units 22202 (e.g., units creating food, desserts, plates, utensils, cutlery, kitchen equipment, and the like) with awareness of the status of other relevant entities involved in other workflows, such as what other work is being done (e.g., to allow for appropriate sequencing of additive manufacturing outputs that align with overall workflows), the priority of the printing job (e.g., based on the timing of a customer order), or other factors. In embodiments, optimization of workflows across a set of additive manufacturing entities may occur by having an artificial intelligence system undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, drill, or the like) and/or finishing entities (that decorate, plate, garnish, arrange, glaze, or the like), including handoffs between sets of different manufacturing entity types, such as where handoffs are handled by robotic handling systems.

In embodiments, the additive manufacturing platform 22210 may be configured as a fixed or mobile system that operates individually or as part of a network, to combine live inputs, library data, personal data, licensed data, and so forth to autonomously design and produce unique parts associated with a live event, for example, personalized mementos, sample products, limited edition artwork, and the like.

In embodiments, the additive manufacturing platform 22210 may acquire real-time or personalized input from the user or venue using 3D scanning such as laser or white light scanners, image recognition, photography, publicly available data, etc. and combine and process the information with existing public or licensed part and data libraries to produce a combined 3D printable dataset and finished products that may be delivered as the customer waits or at a later time to a home, business, or venue seat.

In embodiments, the additive manufacturing platform 22210, such as that associated with a transaction enablement platform network, may be configured and deployed by first responders to support first responder events. For example, in connection with a first responder request, the additive manufacturing units 22202 may be designated to support design and print custom components, parts, equipment, medical devices, accessories, and the like on an on-demand real time basis. Some examples of equipment that may be printed include Personal Protective Equipment (PPE), face shields, goggles or medical glasses, protective eyewear, boots, surgical hoods, earplugs, valves, nozzles, helmets, body shields, extrication tools, and the like.

In embodiments, the equipment may be printed near or at the point of use on a need basis. For example, eyewear, earplugs, helmets, and/or boots may be custom printed based on the patient measurement. Similarly, equipment including respirators, ventilators, custom valves, and nozzles may be printed at a mobile additive manufacturing platform based on immediate patient needs and delivered at the point of care.

In embodiments, the additive manufacturing platform 22210 may automatically determine (such as using the artificial intelligence system 22312 trained on an expert data set) that one or more parts should be additively manufactured to facilitate repair, such as where a complementary part may be generated to replace a worn or absent element of a first responder equipment or device. The additive manufacturing platform 22210 may then process the inputs, such as by using the artificial intelligence system 22312, to determine a recommended action for servicing the repair request.

In embodiments, a set of additive manufacturing units 22202 may be provided as shared resources for multiple tenants of a building, such as a commercial real estate building, where the additive manufacturing units 22202 are integrated with other building resources, such as networking resources (e.g., RF, cellular, Wi-Fi, fiber optic, and other resources), computational resources (e.g., data storage resources, edge, and cloud computational resources), IoT resources (e.g., cameras, sensors, and the like), and others, such that the capabilities of the additive manufacturing units 22202 may be accessed by tenants according to terms and conditions of a lease (which, in embodiments, may be embodied, at least in part, as a smart contract that operates on data from or about the additive manufacturing units 22202). In embodiments, the additive manufacturing platform 22210 may include, link to, or integrate with a set of devices, systems, services, and other resources in a backbone for building, campus, or the like, including a set of network backbone and/or connectivity resources (such as 5G and other cellular network devices and infrastructure, such as switches, access points, gateways, routers, wireless mesh network systems, satellite systems, Wifi systems, long-range RF systems (such as LORA), Zigbee, Bluetooth, and other wireless systems, as well as fixed network systems, such as fiber access gateways and other systems, modems, and other gateway devices for cable, ethernet, digital subscriber line, analog telephone line, and other wired networking systems, each using any of a wide range of protocols, such as ethernet, TCP/IP, UDP, and many others). Shared connectivity resources may include resources for Internet connectivity (such as wireless internet service provider (WISP) resources and fixed ISP connectivity), cellular connectivity (e.g., shared 5G), mesh network connectivity, and many others. In embodiments, the additive manufacturing platform 22210 may include, link to, or integrate with a set of shared data storage resources, such as a blockchain dedicated to the building, campus, or the like, a distributed ledger, a database or other data repository, a distributed memory system using memory of devices and systems that provide the building's IT infrastructure, and others. In embodiments, the additive manufacturing units 22202 and other shared resources may be provisioned, such as by a host or a trained intelligent agent operating on behalf of the host, to enable rapid customization and fulfillment of needs of tenants, such as tenants of a building, campus, city, or the like, including operational needs (such as for spare parts, products, tools, accessories, supplies, replacement parts, and the like, among many others), and many others. Among many examples, additive manufacturing units 22202 may produce elements needed for specialized tenants, such as personal protective equipment, ventilators, wearable items, tools, or the like, as well as elements needed for IT infrastructure (such as connectors, plugs, and the like, such as to fiber optic cables, Ethernet ports, and the like), and many others. In embodiments, the shared resources may be monitored, such as with various utilization tracking techniques, such as event logs of networking nodes, logs of software systems, and the like, and may be provisioned by an automated provisioning system, including allocating payment responsibilities, allocating usage rights, setting prioritization of resource utilization (such as by tenant, by time, by task, and the like), and the like. This may include automated management by an artificial intelligence agent that is trained by a training set of data of expert resource managers. This may be a supervised, semi-supervised, or deep learning process and may include training on outcomes, such as profitability outcomes, tenant feedback outcomes, user satisfaction outcomes, security outcomes, operational outcomes, and many others. Resource sharing and payments may be governed and controlled by a smart contract, such as with governing rules for allocating resources and conditional logic determining prioritization and/or payment responsibilities, optionally operating on a distributed ledger of events involving the resources. In embodiments, the smart contract framework may itself be a shared resource offered to tenants, such as to enable them to offer services, share resources (such as with other tenants, including any of the resources noted herein as well as others), and the like.

Combinations of embodiments are contemplated in yet further embodiments.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements).

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to generate highly customized shapes, such as for compatibility with very specific situations.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to create combinations of metals with other materials (including functionally graded materials (FGMs) and/or graded combinations where there is no sharp boundary between material types).

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility including multiple source materials.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility using multiple extrusion nozzles for simultaneous work on multiple areas.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility using AI to optimize product design, manufacturing process configuration, job scheduling, prioritization, and/or logistics.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to provide additive manufacturing units as shared resources/"as-a-service" nodes/multi-tenant resources (including through smart contracts/blockchains).

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to integrate onboard edge intelligence and smart connectivity.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to integrate into mobile/vehicle-integrated/autonomous configurations.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to couple inputs, process data, and outputs with digital twins.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to couple processes with blockchains and smart contracts.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility to network additive manufacturing nodes in meshes and/or fleets for coordinated operation.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having a manufacturing facility using robots that are able to attach to machines and then print directly onto a replacement.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having fused Deposition Modeling (FDM)™ a/k/a Fused Filament Fabrication™.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having selective laser melting (SLM).

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having selective laser sintering (SLS) where a laser melts flame-retardant plastic powder that solidifies.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having direct metal laser sintering (DMLS).

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having fused deposition modeling (FDM).

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having metal binder jetting that uses print-heads to apply a liquid binding agent onto layers of powder.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having nanoparticle jetting that uses jetting of metal nanoparticles from inkjet nozzles in super-thin layers.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having electron beam freeform fabrication (EBFFF) using electron beam welding.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having selective heat sintering using a thermal printhead heat layer(s) of powdered material to render it thermoplastic.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having stereo-lithography (SLA) using a UV laser to cure a resin of liquid UV-curable photopolymer.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having light polymerization where light causes the polymer to harden in changing areas over time.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having inkjet type printhead delivering liquid/colloidal binder to layers of powdered material.

In embodiments, provided herein is an additive manufacturing management platform having a manufacturing facility to make unusual shapes out of metal (e.g., fluid handling without hoses; biomimicry for heat dissipation and/or turbulence reduction; prosthetic replacements; partial replacements) and having rotary build table deposition.

In embodiments, provided herein is an additive manufacturing management platform having a manufacturing facility to generate highly customized shapes, such as for compatibility with very specific situations.

In embodiments, provided herein is an additive manufacturing management platform having a manufacturing facility to generate highly customized shapes, such as for compatibility with very specific situations and having a manufacturing facility to create combinations of metals with other materials (including functionally graded materials (FGMs) and/or graded combinations where there is no sharp boundary between material types).

In embodiments, provided herein is an additive manufacturing management platform having a manufacturing facility to generate highly customized shapes, such as for compatibility with very specific situations and having a manufacturing facility including multiple source materials.

In embodiments, provided herein is an additive manufacturing management platform having a manufacturing facility to generate highly customized shapes, such as for compatibility with very specific situations and having a manufacturing facility using multiple extrusion nozzles for simultaneous work on multiple areas.

In embodiments, provided herein is an additive manufacturing management platform having a manufacturing facility to generate highly customized shapes, such as for compatibility with very specific situations and having a manufacturing facility using AI to optimize product design, manufacturing process configuration, job scheduling, prioritization, and/or logistics.

In embodiments, provided herein is an additive manufacturing management platform having a manufacturing facility to generate highly customized shapes, such as for compatibility with very specific situations and having a manufacturing facility to provide additive manufacturing units as shared resources/"as-a-service" nodes/multi-tenant resources (including through smart contracts/blockchains).

In embodiments, provided herein is an additive manufacturing management platform having a manufacturing facility to generate highly customized shapes, such as for compatibility with very specific situations and having a manufacturing facility to integrate onboard edge intelligence and smart connectivity.

In embodiments, provided herein is an additive manufacturing management platform having a manufacturing facility to generate highly customized shapes, such as for compatibility with very specific situations and having a manufacturing facility to integrate into mobile/vehicle-integrated/autonomous configurations.

In embodiments, provided herein is an additive manufacturing management platform having a manufacturing facility to generate highly customized shapes, such as for compatibility with very specific situations and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility to generate highly customized shapes, such as for compatibility with very specific situations and having a manufacturing facility to couple inputs, process data, and outputs with digital twins.

In embodiments, provided herein is an additive manufacturing management platform having a manufacturing facility to generate highly customized shapes, such as for compatibility with very specific situations and having a manufacturing facility to couple processes with blockchains and smart contracts.

In embodiments, provided herein is an additive manufacturing management platform having a manufacturing facility to generate highly customized shapes, such as for compatibility with very specific situations and having a manufacturing facility to network additive manufacturing nodes in meshes and/or fleets for coordinated operation.

In embodiments, provided herein is an additive manufacturing management platform having a manufacturing facility to generate highly customized shapes, such as for compatibility with very specific situations and having a manufacturing facility using robots that are able to attach to machines and then print directly onto a replacement.

In embodiments, provided herein is an additive manufacturing management platform having a manufacturing facility to generate highly customized shapes, such as for compatibility with very specific situations and having fused Deposition Modeling (FDM)™ a/k/a Fused Filament Fabrication™.

In embodiments, provided herein is an additive manufacturing management platform having a manufacturing facility to generate highly customized shapes, such as for compatibility with very specific situations and having selective laser melting (SLM).

In embodiments, provided herein is an additive manufacturing management platform having a manufacturing facility to generate highly customized shapes, such as for compatibility with very specific situations and having selective laser sintering (SLS) where a laser melts flame-retardant plastic powder that solidifies.

In embodiments, provided herein is an additive manufacturing management platform having a manufacturing facility to generate highly customized shapes, such as for compatibility with very specific situations and having direct metal laser sintering (DMLS).

In embodiments, provided herein is an additive manufacturing management platform having a manufacturing facility to generate highly customized shapes, such as for compatibility with very specific situations and having fused deposition modeling (FDM).

In embodiments, provided herein is an additive manufacturing management platform having a manufacturing facility to generate highly customized shapes, such as for compatibility with very specific situations and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to generate highly customized shapes, such as for compatibility with very specific situations and having metal binder jetting that uses print-heads to apply a liquid binding agent onto layers of powder.

In embodiments, provided herein is an additive manufacturing management platform having a manufacturing facility to generate highly customized shapes, such as for compatibility with very specific situations and having nanoparticle jetting that uses jetting of metal nanoparticles from inkjet nozzles in super-thin layers.

In embodiments, provided herein is an additive manufacturing management platform having a manufacturing facility to generate highly customized shapes, such as for compatibility with very specific situations and having electron beam freeform fabrication (EBFFF) using electron beam welding.

In embodiments, provided herein is an additive manufacturing management platform having a manufacturing facility to generate highly customized shapes, such as for compatibility with very specific situations and having selective heat sintering using a thermal printhead heat layer(s) of powdered material to render it thermoplastic.

In embodiments, provided herein is an additive manufacturing management platform having a manufacturing facility to generate highly customized shapes, such as for compatibility with very specific situations and having stereo-lithography (SLA) using a UV laser to cure a resin of liquid UV-curable photopolymer.

In embodiments, provided herein is an additive manufacturing management platform having a manufacturing facility to generate highly customized shapes, such as for compatibility with very specific situations and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to generate highly customized shapes, such as for compatibility with very specific situations and having light polymerization where light causes polymer to harden in changing areas over time.

In embodiments, provided herein is an additive manufacturing management platform having a manufacturing facility to generate highly customized shapes, such as for compatibility with very specific situations and having inkjet type printhead delivering liquid/colloidal binder to layers of powdered material.

In embodiments, provided herein is an additive manufacturing management platform having a manufacturing facility to generate highly customized shapes, such as for compatibility with very specific situations and having rotary build table deposition.

In embodiments, provided herein is an additive manufacturing management platform having a manufacturing facility to create combinations of metals with other materials including functionally graded materials (FGMs) and/or graded combinations where there is no sharp boundary between material types.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility including multiple source materials.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility using multiple extrusion nozzles for simultaneous work on multiple areas.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility using AI to optimize product design, manufacturing process configuration, job scheduling, prioritization, and/or logistics.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility to provide additive manufacturing units as shared resources/"as-a-service" nodes/multi-tenant resources (including through smart contracts/blockchains).

In embodiments, provided herein is an additive manufacturing management platform having a manufacturing facility to create combinations of metals with other materials including functionally graded materials (FGMs) and/or graded combinations where there is no sharp boundary between material types and having a manufacturing facility to integrate onboard edge intelligence and smart connectivity.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility to integrate into mobile/vehicle-integrated/autonomous configurations.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility to couple inputs, process data, and outputs with digital twins.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility to couple processes with blockchains and smart contracts.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility to network additive manufacturing nodes in meshes and/or fleets for coordinated operation.

In embodiments, provided herein is an additive manufacturing management platform having a manufacturing facility to create combinations of metals with other materials including functionally graded materials (FGMs) and/or graded combinations where there is no sharp boundary between material types and having a manufacturing facility using robots that are able to attach to machines and then print directly onto a replacement.

In embodiments, provided herein is an additive manufacturing management platform having a manufacturing facility to create combinations of metals with other materials including functionally graded materials (FGMs) and/or graded combinations where there is no sharp boundary between material types and having fused Deposition Modeling (FDM)™ a/k/a Fused Filament Fabrication™.

In embodiments, provided herein is an additive manufacturing management platform having a manufacturing facility to create combinations of metals with other materials including functionally graded materials (FGMs) and/or graded combinations where there is no sharp boundary between material types and having selective laser melting (SLM).

In embodiments, provided herein is an additive manufacturing management platform having a manufacturing facility to create combinations of metals with other materials including functionally graded materials (FGMs) and/or graded combinations where there is no sharp boundary between material types and having selective laser sintering (SLS) where a laser melts flame-retardant plastic powder that solidifies.

In embodiments, provided herein is an additive manufacturing management platform having a manufacturing facility to create combinations of metals with other materials including functionally graded materials (FGMs) and/or graded combinations where there is no sharp boundary between material types and having direct metal laser sintering (DMLS).

In embodiments, provided herein is an additive manufacturing management platform having a manufacturing facility to create combinations of metals with other materials including functionally graded materials (FGMs) and/or graded combinations where there is no sharp boundary between material types and having fused deposition modeling (FDM).

In embodiments, provided herein is an additive manufacturing management platform having a manufacturing facility to create combinations of metals with other materials including functionally graded materials (FGMs) and/or graded combinations where there is no sharp boundary between material types and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to create combinations of metals with other materials including functionally graded materials (FGMs) and/or graded combinations where there is no sharp boundary between material types and having metal binder jetting that uses print-heads to apply a liquid binding agent onto layers of powder.

In embodiments, provided herein is an additive manufacturing management platform having a manufacturing facility to create combinations of metals with other materials including functionally graded materials (FGMs) and/or graded combinations where there is no sharp boundary between material types and having nanoparticle jetting that uses jetting of metal nanoparticles from inkjet nozzles in super-thin layers.

In embodiments, provided herein is an additive manufacturing management platform having a manufacturing facility to create combinations of metals with other materials including functionally graded materials (FGMs) and/or graded combinations where there is no sharp boundary between material types and having electron beam freeform fabrication (EBFFF) using electron beam welding.

In embodiments, provided herein is an additive manufacturing management platform having a manufacturing facility to create combinations of metals with other materials including functionally graded materials (FGMs) and/or graded combinations where there is no sharp boundary between material types and having selective heat sintering using a thermal printhead heat layer(s) of powdered material to render it thermoplastic.

In embodiments, provided herein is an additive manufacturing management platform having a manufacturing facility to create combinations of metals with other materials including functionally graded materials (FGMs) and/or graded combinations where there is no sharp boundary between material types and having stereo-lithography (SLA) using a UV laser to cure a resin of liquid UV-curable photopolymer.

In embodiments, provided herein is an additive manufacturing management platform having a manufacturing facility to create combinations of metals with other materials including functionally graded materials (FGMs) and/or graded combinations where there is no sharp boundary between material types and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to create combinations of metals with other materials including functionally graded materials (FGMs) and/or graded combinations where there is no sharp boundary between material types and having light polymerization where light causes polymer to harden in changing areas over time.

In embodiments, provided herein is an additive manufacturing management platform having a manufacturing facility to create combinations of metals with other materials including functionally graded materials (FGMs) and/or graded combinations where there is no sharp boundary between material types and having inkjet type printhead delivering liquid/colloidal binder to layers of powdered material.

In embodiments, provided herein is an additive manufacturing management platform having a manufacturing facility to create combinations of metals with other materials including functionally graded materials (FGMs) and/or graded combinations where there is no sharp boundary between material types and having rotary build table deposition.

In embodiments, provided herein is an additive manufacturing management platform having a manufacturing facility including multiple source materials.

In embodiments, provided herein is an additive manufacturing management platform having a manufacturing facility including multiple source materials and having a manufacturing facility using multiple extrusion nozzles for simultaneous work on multiple areas.

In embodiments, provided herein is an additive manufacturing management platform having a manufacturing facility including multiple source materials and having a manufacturing facility using AI to optimize product design, manufacturing process configuration, job scheduling, prioritization, and/or logistics.

In embodiments, provided herein is an additive manufacturing management platform having a manufacturing facility including multiple source materials and having a manufacturing facility to provide additive manufacturing units as shared resources/"as-a-service" nodes/multi-tenant resources (including through smart contracts/blockchains).

In embodiments, provided herein is an additive manufacturing management platform having a manufacturing facility including multiple source materials and having a manufacturing facility to integrate onboard edge intelligence and smart connectivity.

In embodiments, provided herein is an additive manufacturing management platform having a manufacturing facility including multiple source materials and having a manufacturing facility to integrate into mobile/vehicle-integrated/autonomous configurations.

In embodiments, provided herein is an additive manufacturing management platform having a manufacturing facility including multiple source materials and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility including multiple source materials and having a manufacturing facility to couple inputs, process data, and outputs with digital twins.

In embodiments, provided herein is an additive manufacturing management platform having a manufacturing facility including multiple source materials and having a manufacturing facility to couple processes with blockchains and smart contracts.

In embodiments, provided herein is an additive manufacturing management platform having a manufacturing facility including multiple source materials and having a manufacturing facility to network additive manufacturing nodes in meshes and/or fleets for coordinated operation.

In embodiments, provided herein is an additive manufacturing management platform having a manufacturing facility including multiple source materials and having a manufacturing facility using robots that are able to attach to machines and then print directly onto a replacement.

In embodiments, provided herein is an additive manufacturing management platform having a manufacturing facility including multiple source materials and having fused Deposition Modeling (FDM)™ a/k/a Fused Filament Fabrication™.

In embodiments, provided herein is an additive manufacturing management platform having a manufacturing facility including multiple source materials and having selective laser melting (SLM).

In embodiments, provided herein is an additive manufacturing management platform having a manufacturing facility including multiple source materials and having selective laser sintering (SLS) where a laser melts flame-retardant plastic powder that solidifies.

In embodiments, provided herein is an additive manufacturing management platform having a manufacturing facility including multiple source materials and having direct metal laser sintering (DMLS).

In embodiments, provided herein is an additive manufacturing management platform having a manufacturing facility including multiple source materials and having fused deposition modeling (FDM).

In embodiments, provided herein is an additive manufacturing management platform having a manufacturing facility including multiple source materials and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility including multiple source materials and having metal binder jetting that uses print-heads to apply a liquid binding agent onto layers of powder.

In embodiments, provided herein is an additive manufacturing management platform having a manufacturing facility including multiple source materials and having nanoparticle jetting that uses jetting of metal nanoparticles from inkjet nozzles in super-thin layers.

In embodiments, provided herein is an additive manufacturing management platform having a manufacturing facility including multiple source materials and having electron beam freeform fabrication (EBFFF) using electron beam welding.

In embodiments, provided herein is an additive manufacturing management platform having a manufacturing facility including multiple source materials and having selective heat sintering using a thermal printhead heat layer(s) of powdered material to render it thermoplastic.

In embodiments, provided herein is an additive manufacturing management platform having a manufacturing facility including multiple source materials and having stereo-lithography (SLA) using a UV laser to cure a resin of liquid UV-curable photopolymer.

In embodiments, provided herein is an additive manufacturing management platform having a manufacturing facility including multiple source materials and having digital light processing (DLP) projecting an image of a cross-section of an object into a quantity of photopolymer (light reactive plastic) that selectively hardens the image area.

In embodiments, provided herein is an additive manufacturing management platform having a manufacturing facility including multiple source materials and having light polymerization where light causes polymer to harden in changing areas over time.

In embodiments, provided herein is an additive manufacturing management platform having a manufacturing facility including multiple source materials and having inkjet type printhead delivering liquid/colloidal binder to layers of powdered material.

In embodiments, provided herein is an additive manufacturing management platform having a manufacturing facility including multiple source materials and having rotary build table deposition.

In embodiments, provided herein is an additive manufacturing management platform having a manufacturing facility using multiple extrusion nozzles for simultaneous work on multiple areas.

In embodiments, provided herein is an additive manufacturing management platform having a manufacturing facility using multiple extrusion nozzles for simultaneous work on multiple areas and having a manufacturing facility using AI to optimize product design, manufacturing process configuration, job scheduling, prioritization, and/or logistics.

In embodiments, provided herein is an additive manufacturing management platform having a manufacturing facility using multiple extrusion nozzles for simultaneous work on multiple areas and having a manufacturing facility to provide additive manufacturing units as shared resources/"as-a-service" nodes/multi-tenant resources (including through smart contracts/blockchains).

In embodiments, provided herein is an additive manufacturing management platform having a manufacturing facility using multiple extrusion nozzles for simultaneous work on multiple areas and having a manufacturing facility to integrate onboard edge intelligence and smart connectivity.

In embodiments, provided herein is an additive manufacturing management platform having a manufacturing facility using multiple extrusion nozzles for simultaneous work on multiple areas and having a manufacturing facility to integrate into mobile/vehicle-integrated/autonomous configurations.

In embodiments, provided herein is an additive manufacturing management platform having a manufacturing facility using multiple extrusion nozzles for simultaneous work on multiple areas and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility using multiple extrusion nozzles for simultaneous work on multiple areas and having a manufacturing facility to couple inputs, process data, and outputs with digital twins.

In embodiments, provided herein is an additive manufacturing management platform having a manufacturing facility using multiple extrusion nozzles for simultaneous work on multiple areas and having a manufacturing facility to couple processes with blockchains and smart contracts.

In embodiments, provided herein is an additive manufacturing management platform having a manufacturing facility using multiple extrusion nozzles for simultaneous work on multiple areas and having a manufacturing facility to network additive manufacturing nodes in meshes and/or fleets for coordinated operation.

In embodiments, provided herein is an additive manufacturing management platform having a manufacturing facility using multiple extrusion nozzles for simultaneous work on multiple areas and having a manufacturing facility using robots that are able to attach to machines and then print directly onto a replacement.

In embodiments, provided herein is an additive manufacturing management platform having a manufacturing facility using multiple extrusion nozzles for simultaneous work on multiple areas and having fused Deposition Modeling (FDM)™ a/k/a Fused Filament Fabrication™.

In embodiments, provided herein is an additive manufacturing management platform having a manufacturing facility using multiple extrusion nozzles for simultaneous work on multiple areas and having selective laser melting (SLM).

In embodiments, provided herein is an additive manufacturing management platform having a manufacturing facility using multiple extrusion nozzles for simultaneous work on multiple areas and having selective laser sintering (SLS) where a laser melts flame-retardant plastic powder that solidifies.

In embodiments, provided herein is an additive manufacturing management platform having a manufacturing facility using multiple extrusion nozzles for simultaneous work on multiple areas and having direct metal laser sintering (DMLS).

In embodiments, provided herein is an additive manufacturing management platform having a manufacturing facility using multiple extrusion nozzles for simultaneous work on multiple areas and having fused deposition modeling (FDM).

In embodiments, provided herein is an additive manufacturing management platform having a manufacturing facility using multiple extrusion nozzles for simultaneous work on multiple areas and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility using multiple extrusion nozzles for simultaneous work on multiple areas and having metal binder jetting that uses print-heads to apply a liquid binding agent onto layers of powder.

In embodiments, provided herein is an additive manufacturing management platform having a manufacturing facility using multiple extrusion nozzles for simultaneous work on multiple areas and having nanoparticle jetting that uses jetting of metal nanoparticles from inkjet nozzles in super-thin layers.

In embodiments, provided herein is an additive manufacturing management platform having a manufacturing facility using multiple extrusion nozzles for simultaneous work on multiple areas and having electron beam freeform fabrication (EBFFF) using electron beam welding.

In embodiments, provided herein is an additive manufacturing management platform having a manufacturing facility using multiple extrusion nozzles for simultaneous work on multiple areas and having selective heat sintering using a thermal printhead heat layer(s) of powdered material to render it thermoplastic.

In embodiments, provided herein is an additive manufacturing management platform having a manufacturing facility using multiple extrusion nozzles for simultaneous work on multiple areas and having stereo-lithography (SLA) using a UV laser to cure a resin of liquid UV-curable photopolymer.

In embodiments, provided herein is an additive manufacturing management platform having a manufacturing facility using multiple extrusion nozzles for simultaneous work on multiple areas and having digital light processing (DLP) projecting an image of a cross-section of an object into a quantity of photopolymer (light reactive plastic) that selectively hardens the image area. In embodiments, provided herein is an additive manufacturing management platform having a manufacturing facility using multiple extrusion nozzles for simultaneous work on multiple areas and having light polymerization where light causes polymer to harden in changing areas over time.

In embodiments, provided herein is an additive manufacturing management platform having a manufacturing facility using multiple extrusion nozzles for simultaneous work on multiple areas and having inkjet type printhead delivering liquid/colloidal binder to layers of powdered material.

In embodiments, provided herein is an additive manufacturing management platform having a manufacturing facility using multiple extrusion nozzles for simultaneous work on multiple areas and having rotary build table deposition.

In embodiments, provided herein is an additive manufacturing management platform having a manufacturing facility using AI to optimize product design, manufacturing process configuration, job scheduling, prioritization, and/or logistics.

In embodiments, provided herein is an additive manufacturing management platform having a manufacturing facility using AI to optimize product design, manufacturing process configuration, job scheduling, prioritization, and/or logistics and having a manufacturing facility to provide additive manufacturing units as shared resources/"as-a-service" nodes/multi-tenant resources (including through smart contracts/blockchains).

In embodiments, provided herein is an additive manufacturing management platform having a manufacturing facility using AI to optimize product design, manufacturing process configuration, job scheduling, prioritization, and/or logistics and having a manufacturing facility to integrate onboard edge intelligence and smart connectivity.

In embodiments, provided herein is an additive manufacturing management platform having a manufacturing facility using AI to optimize product design, manufacturing process configuration, job scheduling, prioritization, and/or logistics and having a manufacturing facility to integrate into mobile/vehicle-integrated/autonomous configurations.

In embodiments, provided herein is an additive manufacturing management platform having a manufacturing facility using AI to optimize product design, manufacturing process configuration, job scheduling, prioritization, and/or logistics and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility using AI to optimize product design, manufacturing process configuration, job scheduling, prioritization, and/or logistics and having a manufacturing facility to couple inputs, process data, and outputs with digital twins.

In embodiments, provided herein is an additive manufacturing management platform having a manufacturing facility using AI to optimize product design, manufacturing process configuration, job scheduling, prioritization, and/or logistics and having a manufacturing facility to couple processes with blockchains and smart contracts.

In embodiments, provided herein is an additive manufacturing management platform having a manufacturing facility using AI to optimize product design, manufacturing process configuration, job scheduling, prioritization, and/or logistics and having a manufacturing facility to network additive manufacturing nodes in meshes and/or fleets for coordinated operation.

In embodiments, provided herein is an additive manufacturing management platform having a manufacturing facility using AI to optimize product design, manufacturing process configuration, job scheduling, prioritization, and/or logistics and having a manufacturing facility using robots that are able to attach to machines and then print directly onto a replacement.

In embodiments, provided herein is an additive manufacturing management platform having a manufacturing facility using AI to optimize product design, manufacturing process configuration, job scheduling, prioritization, and/or logistics and having fused Deposition Modeling (FDM)™ a/k/a Fused Filament Fabrication™.

In embodiments, provided herein is an additive manufacturing management platform having a manufacturing facility using AI to optimize product design, manufacturing process configuration, job scheduling, prioritization, and/or logistics and having selective laser melting (SLM).

In embodiments, provided herein is an additive manufacturing management platform having a manufacturing facility using AI to optimize product design, manufacturing process configuration, job scheduling, prioritization, and/or logistics and having selective laser sintering (SLS) where a laser melts flame-retardant plastic powder that solidifies.

In embodiments, provided herein is an additive manufacturing management platform having a manufacturing facility using AI to optimize product design, manufacturing process configuration, job scheduling, prioritization, and/or logistics and having direct metal laser sintering (DMLS).

In embodiments, provided herein is an additive manufacturing management platform having a manufacturing facility using AI to optimize product design, manufacturing process configuration, job scheduling, prioritization, and/or logistics and having fused deposition modeling (FDM).

In embodiments, provided herein is an additive manufacturing management platform having a manufacturing facility using AI to optimize product design, manufacturing process configuration, job scheduling, prioritization, and/or logistics and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility using AI to optimize product design, manufacturing process configuration, job scheduling, prioritization, and/or logistics and having metal binder jetting that uses print-heads to apply a liquid binding agent onto layers of powder.

In embodiments, provided herein is an additive manufacturing management platform having a manufacturing facility using AI to optimize product design, manufacturing process configuration, job scheduling, prioritization, and/or logistics and having nanoparticle jetting that uses jetting of metal nanoparticles from inkjet nozzles in super-thin layers.

In embodiments, provided herein is an additive manufacturing management platform having a manufacturing facility using AI to optimize product design, manufacturing process configuration, job scheduling, prioritization, and/or logistics and having electron beam freeform fabrication (EBFFF) using electron beam welding.

In embodiments, provided herein is an additive manufacturing management platform having a manufacturing facility using AI to optimize product design, manufacturing process configuration, job scheduling, prioritization, and/or logistics and having selective heat sintering using a thermal printhead heat layer(s) of powdered material to render it thermoplastic.

In embodiments, provided herein is an additive manufacturing management platform having a manufacturing facility using AI to optimize product design, manufacturing process configuration, job scheduling, prioritization, and/or logistics and having stereo-lithography (SLA) using a UV laser to cure a resin of liquid UV-curable photopolymer.

In embodiments, provided herein is an additive manufacturing management platform having a manufacturing facility using AI to optimize product design, manufacturing process configuration, job scheduling, prioritization, and/or logistics and having digital light processing (DLP) projecting an image of a cross-section of an object into a quantity of photopolymer (light reactive plastic) that selectively hardens the image area.

In embodiments, provided herein is an additive manufacturing management platform having a manufacturing facility using AI to optimize product design, manufacturing process configuration, job scheduling, prioritization, and/or logistics and having light polymerization where light causes polymer to harden in changing areas over time.

In embodiments, provided herein is an additive manufacturing management platform having a manufacturing facility using AI to optimize product design, manufacturing process configuration, job scheduling, prioritization, and/or logistics and having inkjet type printhead delivering liquid/colloidal binder to layers of powdered material.

In embodiments, provided herein is an additive manufacturing management platform having a manufacturing facility using AI to optimize product design, manufacturing process configuration, job scheduling, prioritization, and/or logistics and having rotary build table deposition.

In embodiments, provided herein is an additive manufacturing management platform having a manufacturing facility to provide additive manufacturing units as shared resources/"as-a-service" nodes/multi-tenant resources (including through smart contracts/blockchains).

In embodiments, provided herein is an additive manufacturing management platform having a manufacturing facility to provide additive manufacturing units as shared resources/"as-a-service" nodes/multi-tenant resources (including through smart contracts/blockchains) and having a manufacturing facility to integrate onboard edge intelligence and smart connectivity.

In embodiments, provided herein is an additive manufacturing management platform having a manufacturing facility to provide additive manufacturing units as shared resources/"as-a-service" nodes/multi-tenant resources (including through smart contracts/blockchains) and having a manufacturing facility to integrate into mobile/vehicle-integrated/autonomous configurations.

In embodiments, provided herein is an additive manufacturing management platform having a manufacturing facility to provide additive manufacturing units as shared resources/"as-a-service" nodes/multi-tenant resources (including through smart contracts/blockchains) and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility to provide additive manufacturing units as shared resources/"as-a-service" nodes/multi-tenant resources (including through smart contracts/blockchains) and having a manufacturing facility to couple inputs, process data, and outputs with digital twins.

In embodiments, provided herein is an additive manufacturing management platform having a manufacturing facility to provide additive manufacturing units as shared resources/"as-a-service" nodes/multi-tenant resources (including through smart contracts/blockchains) and having a manufacturing facility to couple processes with blockchains and smart contracts.

In embodiments, provided herein is an additive manufacturing management platform having a manufacturing facility to provide additive manufacturing units as shared resources/"as-a-service" nodes/multi-tenant resources (including through smart contracts/blockchains) and having a manufacturing facility to network additive manufacturing nodes in meshes and/or fleets for coordinated operation.

In embodiments, provided herein is an additive manufacturing management platform having a manufacturing facility to provide additive manufacturing units as shared resources/

"as-a-service" nodes/multi-tenant resources (including through smart contracts/blockchains) and having a manufacturing facility using robots that are able to attach to machines and then print directly onto a replacement.

In embodiments, provided herein is an additive manufacturing management platform having a manufacturing facility to provide additive manufacturing units as shared resources/"as-a-service" nodes/multi-tenant resources (including through smart contracts/blockchains) and having fused Deposition Modeling (FDM)™ a/k/a Fused Filament Fabrication™.

In embodiments, provided herein is an additive manufacturing management platform having a manufacturing facility to provide additive manufacturing units as shared resources/"as-a-service" nodes/multi-tenant resources (including through smart contracts/blockchains) and having selective laser melting (SLM).

In embodiments, provided herein is an additive manufacturing management platform having a manufacturing facility to provide additive manufacturing units as shared resources/"as-a-service" nodes/multi-tenant resources (including through smart contracts/blockchains) and having selective laser sintering (SLS) where a laser melts flame-retardant plastic powder that solidifies.

In embodiments, provided herein is an additive manufacturing management platform having a manufacturing facility to provide additive manufacturing units as shared resources/"as-a-service" nodes/multi-tenant resources (including through smart contracts/blockchains) and having direct metal laser sintering (DMLS).

In embodiments, provided herein is an additive manufacturing management platform having a manufacturing facility to provide additive manufacturing units as shared resources/"as-a-service" nodes/multi-tenant resources (including through smart contracts/blockchains) and having fused deposition modeling (FDM).

In embodiments, provided herein is an additive manufacturing management platform having a manufacturing facility to provide additive manufacturing units as shared resources/"as-a-service" nodes/multi-tenant resources (including through smart contracts/blockchains) and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to provide additive manufacturing units as shared resources/"as-a-service" nodes/multi-tenant resources (including through smart contracts/blockchains) and having metal binder jetting that uses print-heads to apply a liquid binding agent onto layers of powder.

In embodiments, provided herein is an additive manufacturing management platform having a manufacturing facility to provide additive manufacturing units as shared resources/"as-a-service" nodes/multi-tenant resources (including through smart contracts/blockchains) and having nanoparticle jetting that uses jetting of metal nanoparticles from inkjet nozzles in super-thin layers.

In embodiments, provided herein is an additive manufacturing management platform having a manufacturing facility to provide additive manufacturing units as shared resources/"as-a-service" nodes/multi-tenant resources (including through smart contracts/blockchains) and having electron beam freeform fabrication (EBFFF) using electron beam welding.

In embodiments, provided herein is an additive manufacturing management platform having a manufacturing facility to provide additive manufacturing units as shared resources/"as-a-service" nodes/multi-tenant resources (including through smart contracts/blockchains) and having selective heat sintering using a thermal printhead heat layer(s) of powdered material to render it thermoplastic.

In embodiments, provided herein is an additive manufacturing management platform having a manufacturing facility to provide additive manufacturing units as shared resources/"as-a-service" nodes/multi-tenant resources (including through smart contracts/blockchains) and having stereolithography (SLA) using a UV laser to cure a resin of liquid UV-curable photopolymer.

In embodiments, provided herein is an additive manufacturing management platform having a manufacturing facility to provide additive manufacturing units as shared resources/"as-a-service" nodes/multi-tenant resources (including through smart contracts/blockchains) and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to provide additive manufacturing units as shared resources/"as-a-service" nodes/multi-tenant resources (including through smart contracts/blockchains) and having light polymerization where light causes polymer to harden in changing areas over time.

In embodiments, provided herein is an additive manufacturing management platform having a manufacturing facility to provide additive manufacturing units as shared resources/"as-a-service" nodes/multi-tenant resources (including through smart contracts/blockchains) and having inkjet type printhead delivering liquid/colloidal binder to layers of powdered material.

In embodiments, provided herein is an additive manufacturing management platform having a manufacturing facility to provide additive manufacturing units as shared resources/"as-a-service" nodes/multi-tenant resources (including through smart contracts/blockchains) and having rotary build table deposition.

In embodiments, provided herein is an additive manufacturing management platform having a manufacturing facility to integrate onboard edge intelligence and smart connectivity.

In embodiments, provided herein is an additive manufacturing management platform having a manufacturing facility to integrate onboard edge intelligence and smart connectivity and having a manufacturing facility to integrate into mobile/vehicle-integrated/autonomous configurations.

In embodiments, provided herein is an additive manufacturing management platform having a manufacturing facility to integrate onboard edge intelligence and smart connectivity and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility to integrate onboard edge intelligence and smart connectivity and having a manufacturing facility to couple inputs, process data, and outputs with digital twins.

In embodiments, provided herein is an additive manufacturing management platform having a manufacturing facility to integrate onboard edge intelligence and smart connectivity and having a manufacturing facility to couple processes with blockchains and smart contracts.

In embodiments, provided herein is an additive manufacturing management platform having a manufacturing facility to integrate onboard edge intelligence and smart connectivity and having a manufacturing facility to network additive manufacturing nodes in meshes and/or fleets for coordinated operation.

In embodiments, provided herein is an additive manufacturing management platform having a manufacturing facility to integrate onboard edge intelligence and smart connectivity and having a manufacturing facility using robots that are able to attach to machines and then print directly onto a replacement.

In embodiments, provided herein is an additive manufacturing management platform having a manufacturing facility to integrate onboard edge intelligence and smart connectivity and having fused Deposition Modeling (FDM)™ a/k/a Fused Filament Fabrication™.

In embodiments, provided herein is an additive manufacturing management platform having a manufacturing facility to integrate onboard edge intelligence and smart connectivity and having selective laser melting (SLM).

In embodiments, provided herein is an additive manufacturing management platform having a manufacturing facility to integrate onboard edge intelligence and smart connectivity and having selective laser sintering (SLS) where a laser melts flame-retardant plastic powder that solidifies.

In embodiments, provided herein is an additive manufacturing management platform having a manufacturing facility to integrate onboard edge intelligence and smart connectivity and having direct metal laser sintering (DMLS).

In embodiments, provided herein is an additive manufacturing management platform having a manufacturing facility to integrate onboard edge intelligence and smart connectivity and having fused deposition modeling (FDM).

In embodiments, provided herein is an additive manufacturing management platform having a manufacturing facility to integrate onboard edge intelligence and smart connectivity and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to integrate onboard edge intelligence and smart connectivity and having metal binder jetting that uses print-heads to apply a liquid binding agent onto layers of powder.

In embodiments, provided herein is an additive manufacturing management platform having a manufacturing facility to integrate onboard edge intelligence and smart connectivity and having nanoparticle jetting that uses jetting of metal nanoparticles from inkjet nozzles in super-thin layers.

In embodiments, provided herein is an additive manufacturing management platform having a manufacturing facility to integrate onboard edge intelligence and smart connectivity and having electron beam freeform fabrication (EBFFF) using electron beam welding.

In embodiments, provided herein is an additive manufacturing management platform having a manufacturing facility to integrate onboard edge intelligence and smart connectivity and having selective heat sintering using a thermal printhead heat layer(s) of powdered material to render it thermoplastic.

In embodiments, provided herein is an additive manufacturing management platform having a manufacturing facility to integrate onboard edge intelligence and smart connectivity and having stereo-lithography (SLA) using a UV laser to cure a resin of liquid UV-curable photopolymer.

In embodiments, provided herein is an additive manufacturing management platform having a manufacturing facility to integrate onboard edge intelligence and smart connectivity and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to integrate onboard edge intelligence and smart connectivity and having light polymerization where light causes polymer to harden in changing areas over time.

In embodiments, provided herein is an additive manufacturing management platform having a manufacturing facility to integrate onboard edge intelligence and smart connectivity and having inkjet type printhead delivering liquid/colloidal binder to layers of powdered material.

In embodiments, provided herein is an additive manufacturing management platform having a manufacturing facility to integrate onboard edge intelligence and smart connectivity and having rotary build table deposition.

In embodiments, provided herein is an additive manufacturing management platform having a manufacturing facility to integrate into mobile/vehicle-integrated/autonomous configurations.

In embodiments, provided herein is an additive manufacturing management platform having a manufacturing facility to integrate into mobile/vehicle-integrated/autonomous configurations and having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility to integrate into mobile/vehicle-integrated/autonomous configurations and having a manufacturing facility to couple inputs, process data, and outputs with digital twins.

In embodiments, provided herein is an additive manufacturing management platform having a manufacturing facility to integrate into mobile/vehicle-integrated/autonomous configurations and having a manufacturing facility to couple processes with blockchains and smart contracts.

In embodiments, provided herein is an additive manufacturing management platform having a manufacturing facility to integrate into mobile/vehicle-integrated/autonomous configurations and having a manufacturing facility to network additive manufacturing nodes in meshes and/or fleets for coordinated operation.

In embodiments, provided herein is an additive manufacturing management platform having a manufacturing facility to integrate into mobile/vehicle-integrated/autonomous configurations and having a manufacturing facility using robots that are able to attach to machines and then print directly onto a replacement.

In embodiments, provided herein is an additive manufacturing management platform having a manufacturing facility to integrate into mobile/vehicle-integrated/autonomous configurations and having fused Deposition Modeling (FDM)™ a/k/a Fused Filament Fabrication™.

In embodiments, provided herein is an additive manufacturing management platform having a manufacturing facility to integrate into mobile/vehicle-integrated/autonomous configurations and having selective laser melting (SLM).

In embodiments, provided herein is an additive manufacturing management platform having a manufacturing facility to integrate into mobile/vehicle-integrated/autonomous configurations and having selective laser sintering (SLS) where a laser melts flame-retardant plastic powder that solidifies.

In embodiments, provided herein is an additive manufacturing management platform having a manufacturing facility to integrate into mobile/vehicle-integrated/autonomous configurations and having direct metal laser sintering (DMLS).

In embodiments, provided herein is an additive manufacturing management platform having a manufacturing facility to integrate into mobile/vehicle-integrated/autonomous configurations and having fused deposition modeling (FDM).

In embodiments, provided herein is an additive manufacturing management platform having a manufacturing facility to integrate into mobile/vehicle-integrated/autonomous configurations and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to integrate into mobile/vehicle-integrated/autonomous configurations and having metal binder jetting that uses printheads to apply a liquid binding agent onto layers of powder.

In embodiments, provided herein is an additive manufacturing management platform having a manufacturing facility to integrate into mobile/vehicle-integrated/autonomous configurations and having nanoparticle jetting that uses jetting of metal nanoparticles from inkjet nozzles in super-thin layers.

In embodiments, provided herein is an additive manufacturing management platform having a manufacturing facility to integrate into mobile/vehicle-integrated/autonomous configurations and having electron beam freeform fabrication (EBFFF) using electron beam welding.

In embodiments, provided herein is an additive manufacturing management platform having a manufacturing facility to integrate into mobile/vehicle-integrated/autonomous configurations and having selective heat sintering using a thermal printhead heat layer(s) of powdered material to render it thermoplastic.

In embodiments, provided herein is an additive manufacturing management platform having a manufacturing facility to integrate into mobile/vehicle-integrated/autonomous configurations and having stereo-lithography (SLA) using a UV laser to cure a resin of liquid UV-curable photopolymer.

In embodiments, provided herein is an additive manufacturing management platform having a manufacturing facility to integrate into mobile/vehicle-integrated/autonomous configurations and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to integrate into mobile/vehicle-integrated/autonomous configurations and having light polymerization where light causes polymer to harden in changing areas over time.

In embodiments, provided herein is an additive manufacturing management platform having a manufacturing facility to integrate into mobile/vehicle-integrated/autonomous configurations and having inkjet type printhead delivering liquid/colloidal binder to layers of powdered material.

In embodiments, provided herein is an additive manufacturing management platform having a manufacturing facility to integrate into mobile/vehicle-integrated/autonomous configurations and having rotary build table deposition.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having a manufacturing facility to couple inputs, process data, and outputs with digital twins.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having a manufacturing facility to couple processes with blockchains and smart contracts.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having a manufacturing facility to network additive manufacturing nodes in meshes and/or fleets for coordinated operation.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having a manufacturing facility using robots that are able to attach to machines and then print directly onto a replacement.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having fused Deposition Modeling (FDM)™ a/k/a Fused Filament Fabrication™.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having selective laser melting (SLM).

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having selective laser sintering (SLS) where a laser melts flame-retardant plastic powder that solidifies.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having direct metal laser sintering (DMLS).

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having fused deposition modeling (FDM).

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having metal extrusion where a filament or rod consisting of polymer and heavily loaded with metal powder is extruded through a nozzle (like in FDM) to form the "green" part that is post-processed (debinded and sintered) to create a fully-metal part). In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having metal binder jetting that uses print-heads to apply a liquid binding agent onto layers of powder.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having nanoparticle jetting that uses jetting of metal nanoparticles from inkjet nozzles in super-thin layers.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having electron beam freeform fabrication (EBFFF) using electron beam welding.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having selective heat sintering using a thermal printhead heat layer(s) of powdered material to render it thermoplastic.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having stereo-lithography (SLA) using a UV laser to cure a resin of liquid UV-curable photopolymer.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having light polymerization where light causes polymer to harden in changing areas over time.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having inkjet type printhead delivering liquid/colloidal binder to layers of powdered material.

In embodiments, provided herein is an additive manufacturing management platform having a manufacturing facility to enrich AI with input/source/training set data relevant to design factors, economic factors, quality factors, and the like customized to particular use cases, embodiments, applications, and apparatus and having rotary build table deposition.

In embodiments, provided herein is an additive manufacturing management platform having a manufacturing facility to couple inputs, process data, and outputs with digital twins.

In embodiments, provided herein is an additive manufacturing management platform having a manufacturing facility to couple inputs, process data, and outputs with digital twins and having a manufacturing facility to couple processes with blockchains and smart contracts.

In embodiments, provided herein is an additive manufacturing management platform having a manufacturing facility to couple inputs, process data, and outputs with digital twins and having a manufacturing facility to network additive manufacturing nodes in meshes and/or fleets for coordinated operation.

In embodiments, provided herein is an additive manufacturing management platform having a manufacturing facility to couple inputs, process data, and outputs with digital twins and having a manufacturing facility using robots that are able to attach to machines and then print directly onto a replacement.

In embodiments, provided herein is an additive manufacturing management platform having a manufacturing facility to couple inputs, process data, and outputs with digital twins and having fused Deposition Modeling (FDM)™ a/k/a Fused Filament Fabrication™.

In embodiments, provided herein is an additive manufacturing management platform having a manufacturing facility to couple inputs, process data, and outputs with digital twins and having selective laser melting (SLM).

In embodiments, provided herein is an additive manufacturing management platform having a manufacturing facility to couple inputs, process data, and outputs with digital twins and having selective laser sintering (SLS) where a laser melts flame-retardant plastic powder that solidifies.

In embodiments, provided herein is an additive manufacturing management platform having a manufacturing facility to couple inputs, process data, and outputs with digital twins and having direct metal laser sintering (DMLS).

In embodiments, provided herein is an additive manufacturing management platform having a manufacturing facility to couple inputs, process data, and outputs with digital twins and having fused deposition modeling (FDM).

In embodiments, provided herein is an additive manufacturing management platform having a manufacturing facility to couple inputs, process data, and outputs with digital twins and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to couple inputs, process data, and outputs with digital twins and having metal binder jetting that uses print-heads to apply a liquid binding agent onto layers of powder.

In embodiments, provided herein is an additive manufacturing management platform having a manufacturing facility to couple inputs, process data, and outputs with digital twins and having nanoparticle jetting that uses jetting of metal nanoparticles from inkjet nozzles in super-thin layers.

In embodiments, provided herein is an additive manufacturing management platform having a manufacturing facility to couple inputs, process data, and outputs with digital twins and having electron beam freeform fabrication (EBFFF) using electron beam welding.

In embodiments, provided herein is an additive manufacturing management platform having a manufacturing facility to couple inputs, process data, and outputs with digital twins and having selective heat sintering using a thermal printhead heat layer(s) of powdered material to render it thermoplastic.

In embodiments, provided herein is an additive manufacturing management platform having a manufacturing facility to couple inputs, process data, and outputs with digital twins and having stereo-lithography (SLA) using a UV laser to cure a resin of liquid UV-curable photopolymer.

In embodiments, provided herein is an additive manufacturing management platform having a manufacturing facility to couple inputs, process data, and outputs with digital twins and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to couple inputs, process data, and outputs with digital twins and having light polymerization where light causes polymer to harden in changing areas over time.

In embodiments, provided herein is an additive manufacturing management platform having a manufacturing facility to couple inputs, process data, and outputs with digital twins and having inkjet type printhead delivering liquid/colloidal binder to layers of powdered material.

In embodiments, provided herein is an additive manufacturing management platform having a manufacturing facility to couple inputs, process data, and outputs with digital twins and having rotary build table deposition.

In embodiments, provided herein is an additive manufacturing management platform having a manufacturing facility to couple processes with blockchains and smart contracts.

In embodiments, provided herein is an additive manufacturing management platform having a manufacturing facility to couple processes with blockchains and smart contracts and having a manufacturing facility to network additive manufacturing nodes in meshes and/or fleets for coordinated operation.

In embodiments, provided herein is an additive manufacturing management platform having a manufacturing facility to couple processes with blockchains and smart contracts and having a manufacturing facility using robots that are able to attach to machines and then print directly onto a replacement.

In embodiments, provided herein is an additive manufacturing management platform having a manufacturing facility to couple processes with blockchains and smart contracts and having fused Deposition Modeling (FDM)™ a/k/a Fused Filament Fabrication™.

In embodiments, provided herein is an additive manufacturing management platform having a manufacturing facility to couple processes with blockchains and smart contracts and having selective laser melting (SLM).

In embodiments, provided herein is an additive manufacturing management platform having a manufacturing facility to couple processes with blockchains and smart contracts and having selective laser sintering (SLS) where a laser melts flame-retardant plastic powder that solidifies.

In embodiments, provided herein is an additive manufacturing management platform having a manufacturing facility to couple processes with blockchains and smart contracts and having direct metal laser sintering (DMLS).

In embodiments, provided herein is an additive manufacturing management platform having a manufacturing facility to couple processes with blockchains and smart contracts and having fused deposition modeling (FDM).

In embodiments, provided herein is an additive manufacturing management platform having a manufacturing facility to couple processes with blockchains and smart contracts and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to couple processes with blockchains and smart contracts and having metal binder jetting that uses print-heads to apply a liquid binding agent onto layers of powder.

In embodiments, provided herein is an additive manufacturing management platform having a manufacturing facility to couple processes with blockchains and smart contracts and having nanoparticle jetting that uses jetting of metal nanoparticles from inkjet nozzles in super-thin layers.

In embodiments, provided herein is an additive manufacturing management platform having a manufacturing facility to couple processes with blockchains and smart contracts and having electron beam freeform fabrication (EBFFF) using electron beam welding.

In embodiments, provided herein is an additive manufacturing management platform having a manufacturing facility to couple processes with blockchains and smart contracts and having selective heat sintering using a thermal printhead heat layer(s) of powdered material to render it thermoplastic.

In embodiments, provided herein is an additive manufacturing management platform having a manufacturing facility to couple processes with blockchains and smart contracts and having stereo-lithography (SLA) using a UV laser to cure a resin of liquid UV-curable photopolymer.

In embodiments, provided herein is an additive manufacturing management platform having a manufacturing facility to couple processes with blockchains and smart contracts and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to couple processes with blockchains and smart contracts and having light polymerization where light causes polymer to harden in changing areas over time.

In embodiments, provided herein is an additive manufacturing management platform having a manufacturing facility to couple processes with blockchains and smart contracts and having inkjet type printhead delivering liquid/colloidal binder to layers of powdered material.

In embodiments, provided herein is an additive manufacturing management platform having a manufacturing facility to couple processes with blockchains and smart contracts and having rotary build table deposition.

In embodiments, provided herein is an additive manufacturing management platform having a manufacturing facility to network additive manufacturing nodes in meshes and/or fleets for coordinated operation.

In embodiments, provided herein is an additive manufacturing management platform having a manufacturing facility to network additive manufacturing nodes in meshes and/or fleets for coordinated operation and having a manufacturing facility using robots that are able to attach to machines and then print directly onto a replacement.

In embodiments, provided herein is an additive manufacturing management platform having a manufacturing facility to network additive manufacturing nodes in meshes and/or fleets for coordinated operation and having fused Deposition Modeling (FDM)™ a/k/a Fused Filament Fabrication™.

In embodiments, provided herein is an additive manufacturing management platform having a manufacturing facility to network additive manufacturing nodes in meshes and/or fleets for coordinated operation and having selective laser melting (SLM).

In embodiments, provided herein is an additive manufacturing management platform having a manufacturing facility to network additive manufacturing nodes in meshes and/or fleets for coordinated operation and having selective laser sintering (SLS) where a laser melts flame-retardant plastic powder that solidifies.

In embodiments, provided herein is an additive manufacturing management platform having a manufacturing facility to network additive manufacturing nodes in meshes and/or fleets for coordinated operation and having direct metal laser sintering (DMLS).

In embodiments, provided herein is an additive manufacturing management platform having a manufacturing facility to network additive manufacturing nodes in meshes and/or fleets for coordinated operation and having fused deposition modeling (FDM).

In embodiments, provided herein is an additive manufacturing management platform having a manufacturing facility to network additive manufacturing nodes in meshes and/or fleets for coordinated operation and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility to network additive manufacturing nodes in meshes and/or fleets for coordinated operation and having metal binder jetting that uses print-heads to apply a liquid binding agent onto layers of powder.

In embodiments, provided herein is an additive manufacturing management platform having a manufacturing facility to network additive manufacturing nodes in meshes and/or fleets for coordinated operation and having nanoparticle jetting that uses jetting of metal nanoparticles from inkjet nozzles in super-thin layers.

In embodiments, provided herein is an additive manufacturing management platform having a manufacturing facility to network additive manufacturing nodes in meshes and/or fleets for coordinated operation and having electron beam freeform fabrication (EBFFF) using electron beam welding.

In embodiments, provided herein is an additive manufacturing management platform having a manufacturing facility to network additive manufacturing nodes in meshes and/or fleets for coordinated operation and having selective heat sintering using a thermal printhead heat layer(s) of powdered material to render it thermoplastic.

In embodiments, provided herein is an additive manufacturing management platform having a manufacturing facility to network additive manufacturing nodes in meshes and/or fleets for coordinated operation and having stereo-lithography (SLA) using a UV laser to cure a resin of liquid UV-curable photopolymer.

In embodiments, provided herein is an additive manufacturing management platform having a manufacturing facility to network additive manufacturing nodes in meshes and/or fleets for coordinated operation and having digital light processing (DLP) projecting an image of a cross-section of an object into a quantity of photopolymer (light reactive plastic) that selectively hardens the image area.

In embodiments, provided herein is an additive manufacturing management platform having a manufacturing facility to network additive manufacturing nodes in meshes and/or fleets for coordinated operation and having light polymerization where light causes polymer to harden in changing areas over time.

In embodiments, provided herein is an additive manufacturing management platform having a manufacturing facility to network additive manufacturing nodes in meshes and/or fleets for coordinated operation and having inkjet type printhead delivering liquid/colloidal binder to layers of powdered material.

In embodiments, provided herein is an additive manufacturing management platform having a manufacturing facility to network additive manufacturing nodes in meshes and/or fleets for coordinated operation and having rotary build table deposition.

In embodiments, provided herein is an additive manufacturing management platform having a manufacturing facility using robots that are able to attach to machines and then print directly onto a replacement.

In embodiments, provided herein is an additive manufacturing management platform having a manufacturing facility using robots that are able to attach to machines and then print directly onto a replacement and having fused Deposition Modeling (FDM)™ a/k/a Fused Filament Fabrication™.

In embodiments, provided herein is an additive manufacturing management platform having a manufacturing facility using robots that are able to attach to machines and then print directly onto a replacement and having selective laser melting (SLM).

In embodiments, provided herein is an additive manufacturing management platform having a manufacturing facility using robots that are able to attach to machines and then print directly onto a replacement and having selective laser sintering (SLS) where a laser melts flame-retardant plastic powder that solidifies.

In embodiments, provided herein is an additive manufacturing management platform having a manufacturing facility using robots that are able to attach to machines and then print directly onto a replacement and having direct metal laser sintering (DMLS).

In embodiments, provided herein is an additive manufacturing management platform having a manufacturing facility using robots that are able to attach to machines and then print directly onto a replacement and having fused deposition modeling (FDM).

In embodiments, provided herein is an additive manufacturing management platform having a manufacturing facility using robots that are able to attach to machines and then print directly onto a replacement and having metal extrusion where a filament or rod consisting of polymer and heavily loaded with metal powder is extruded through a nozzle (like in FDM) to form the "green" part that is post-processed (debinded and sintered) to create a fully-metal part.

In embodiments, provided herein is an additive manufacturing management platform having a manufacturing facility using robots that are able to attach to machines and then print directly onto a replacement and having metal binder jetting that uses print-heads to apply a liquid binding agent onto layers of powder.

In embodiments, provided herein is an additive manufacturing management platform having a manufacturing facility using robots that are able to attach to machines and then print directly onto a replacement and having nanoparticle jetting that uses jetting of metal nanoparticles from inkjet nozzles in super-thin layers.

In embodiments, provided herein is an additive manufacturing management platform having a manufacturing facility using robots that are able to attach to machines and then print directly onto a replacement and having electron beam freeform fabrication (EBFFF) using electron beam welding.

In embodiments, provided herein is an additive manufacturing management platform having a manufacturing facility using robots that are able to attach to machines and then print directly onto a replacement and having selective heat sintering using a thermal printhead heat layer(s) of powdered material to render it thermoplastic.

In embodiments, provided herein is an additive manufacturing management platform having a manufacturing facility using robots that are able to attach to machines and then print directly onto a replacement and having stereo-lithography (SLA) using a UV laser to cure a resin of liquid UV-curable photopolymer.

In embodiments, provided herein is an additive manufacturing management platform having a manufacturing facility using robots that are able to attach to machines and then print directly onto a replacement and having digital light processing (DLP) projecting an image of a cross-section of an object into a quantity of photopolymer (light reactive plastic) that selectively hardens the image area.

In embodiments, provided herein is an additive manufacturing management platform having a manufacturing facility using robots that are able to attach to machines and then print directly onto a replacement and having light polymerization where light causes polymer to harden in changing areas over time.

In embodiments, provided herein is an additive manufacturing management platform having a manufacturing facility using robots that are able to attach to machines and then print directly onto a replacement and having inkjet type printhead delivering liquid/colloidal binder to layers of powdered material.

In embodiments, provided herein is an additive manufacturing management platform having a manufacturing facility using robots that are able to attach to machines and then print directly onto a replacement and having rotary build table deposition.

Enterprise Access Layer

In network computing, an access layer generally refers to one or more layers in an information technology infrastructure that provides access to the infrastructure. The overarching purpose of the access layer is to grant a user, for example via a system or a device, access to resources of the infrastructure, such as network resources, storage resources, processing resources, and others. For example, in a wide area network (WAN) environment, a network access layer provides access to the corporate network across wide-area technology, such as Frame Relay, Multiprotocol Label Switching (MPLS), Integrated Services Digital Network, leased lines, digital subscriber lines (DSL) over traditional telephone lines or coaxial cable. Since the access layer provides local and remote access to a network, the access layer may function as a concentration point where remote users (e.g., clients, partners, etc.) meet local users or infrastructure.

Protocols in the access layer provide a means for one or more systems to deliver data to other devices or systems connected to a set of infrastructure, such as by a communication network. For instance, these protocols may provide a means to deliver data from a private network to a public network. In this sense, the access layer may be considered an interface that is public or client-facing while also being private-facing. An access layer's private-facing capability may refer to its ability to receive, translate, and/or communicate data corresponding to private resources (e.g., private digital assets) from a private network, while its public or client-facing capability may refer to its ability to communicate with or provide access to users that are external to the private network (e.g., public market participants). In embodiments, to perform its functionality as a network intermediary, a network access layer may have protocols and systems that understand details about the endpoints for which it is a facilitator. In embodiments, an access layer may include various sublayers, services, modules, and components, operating according to a variety of different protocols, such as to enable access among a wide range of participating entities.

One environment that can utilize the functionality of an access layer is an enterprise. An enterprise generally refers to an organization with a particular overarching purpose, goal, or objective. For instance, a purpose may be to produce and market a particular set of one or more product lines, to undertake a charitable activity, to provide a public service, or other purpose. To achieve its purpose, an enterprise may have a structure that includes various business units, such as executive officers, a board of trustees or directors, divisions, departments, managers and other job roles, facilities and other assets, a wide array of projects, activities, processes and workflows, etc. Some enterprises span multiple business sectors and therefore have business units, such as divisions, that can be dedicated to a particular business sector.

Enterprises, usually by their size and nature, can have a wide array of resources and assets. For instance, their resources may include raw materials, equipment, devices, systems, products (e.g., parts, components, sub-assemblies, assemblies), capital, knowledge, and technology among others. Some examples of knowledge resources include resources that are customer-based (e.g., customer lists or customer transactional history such as order history, contact information, demand frequency, etc.), vender/supplier-based (e.g., suppliers, procurement information, supply transactional history, etc.), process-based (e.g., formulations, procedures such as standard operating procedures, technical data sheets, process reports such as material compliance reports or quality reports, or other memorialized process expertise), and research-based (e.g., research and development information or reports). Enterprise resources may also include human resources, including expertise and knowledge of enterprise personnel and contractors, or personnel and contractors of customers, suppliers, vendors, partners, or the like. Technology resources may include resources such as inventions, trade secrets, designs, proprietary information of the enterprise (e.g., proprietary software or processes), and/or the like.

In some embodiments, some or all of the resources of the enterprise may be represented in some digital form (e.g., a particular file format), such that these resources may undergo management and processing actions such as being copied, edited, shared, transferred, exchanged, updated, recorded, monitored, accessed, extracted, transformed, loaded, compressed, decompressed, deleted, obsoleted or otherwise processed, such as in digital form or between digital form and another form (such as where knowledge of an expert worker or other individual is accessed by querying the worker through a crowdsourcing system). Even resources that have not had a conventional digital format (e.g., physical goods or equipment) may be represented in a digital format. For example, a non-fungible token may be used to represent resources that are not digital. Additionally or alternatively, some aspect of a resource (e.g., a physical good) can be represented as a digital form or via a digital proxy. For instance, a physical resource may have an associated digital certificate of authenticity, proof of purchase, deed, or a title.

Due to the expanding evolution of digital assets, it is inevitable that enterprises demand an efficient and robust manner of managing digital assets. For example, just as enterprises have historically and efficiently engaged in the transaction of physical goods and the logistics involved in those transactions, enterprises will likely need to address similar aspects for digital transactions. Furthermore, with digital assets, there may be different issues that need to be addressed due to the digital nature of these assets when compared to physical assets. For instance, although unauthentic copies of physical goods are feasible, often, depending on the physical good, the energy, expertise, or equipment needed to generate a copy of physical goods can by itself inhibit copying and help promote the authenticity of a physical asset. In comparison, a digital asset may be easier to replicate. For example, computing has predominantly evolved with a particular simplicity to read/write functionality; making digital files/formats in many cases effortless to duplicate often with minimal loss. Ease of duplication can result in complications, such as where a digital asset is copied and widely distributed and some copies are subsequently modified, making it difficult to determine which versions, among many, are valid. Problems of provenance and validity are compounded with the increasing presence of dynamic digital such as smart contracts and dynamic objects, that are serially updated without human intervention through a network, often by linkage to other dynamic objects that are of uncertain provenance.

Another aspect that is different between physical assets and digital assets is interoperability. Interoperability refers to the ability of systems to exchange and use information. For a physical asset, supply chains are typically structured by participating enterprises to facilitate structural interoperability, such as among the component parts of a system, chemical operability, such as among constituent ingredients in a recipe, or the like. For digital assets (such term including physical assets that have a digital component or capability (such as smart devices and systems)), interoperability may have a variety of different issues. For example, having the computing resources to interact with a digital asset may not be cost prohibitive. Therefore, there may be a large number of entities that are able to cooperate with regard to a digital asset. Additionally, the number of entities is fairly elastic because it may quickly increase or decrease depending on the scarcity or demand for the digital asset (e.g., due to its low-cost barrier to entry). Yet a potential outgrowth of the large number of entities that are able to interact with a digital asset is that the access point should have the capability to accommodate for variance between the entities and/or the volume of entities; as a result, communication protocols, authentication protocols, validation protocols, formatting protocols, etc. need to consider the many actors that are able to participate in the digital asset ecosystem.

The management of digital assets and the transactions they involve may also be able to capitalize on their digital ecosystem. That is, the mechanism involved in transactions for digital assets may leverage computing resources to promote optimal transactions. In other words, with digital assets being digital, they are inherently associated with computing resources and therefore a transaction ecosystem can utilize the associated computing capabilities to potentially enhance the circumstances of a transaction involving a digital asset. As an example, it is not uncommon for an asset to have some inventory period where the owner or controller of the asset has the asset available but needs to identify a receiving party and/or terms for the transaction of the asset.

With the computing resources associated with the digital asset or available to the holder of the digital asset, a transactional ecosystem can be configured that can provide autonomy and/or self-promotion for transactions or asset management actions for a digital asset; that is, instead of the manual execution or facilitation of agreements regarding the transactions of digital assets, a transactional ecosystem for the digital asset can automate and/or facilitate one or more phases associated with digital asset transactions. These phases may include a discovery/identification phase that identifies a candidate transaction opportunity involving a digital asset, a diligence/evaluation phase that may evaluate the parameters of the transaction opportunity, a configuration phase that may configure the proposed terms of the transaction (e.g., an exchange rate or a time for the transaction), a negotiation phase that may adjust the terms of the transaction through one or more rounds of negotiation, an execution phase that executes the configured transaction for the digital asset and/or a performance phase that executes performance of one or more actions called for by the terms of the transaction (e.g., delivery of a digital asset to a defined address at a defined time). In this sense, the transactional ecosystem may be capable of self-promoting because the transactional systems can identify candidate transactions for a digital asset without potentially needing human intervention. Although this level of autonomy is feasible, the digital ecosystem may also operate as a hybrid such that certain aspects of the transaction request require some form of authorization prior to automatic execution (e.g., authorization from external source such as a manual input). Additional aspects of various phases of digital asset transactions, such as relating to counterparty discovery, monitoring of collateral, automation of underwriting, automated negotiation, and many others are described in the documents incorporated herein by reference and are intended to be encompassed herein except where context prevents) and/or direct instruction to perform one or more of the phases associated with a digital asset transaction.

To address the growing demands for effective digital asset ecosystems, the approach described herein may include an enterprise access layer. In some implementations, an "enterprise" access layer refers to a network access layer by which an enterprise may access various digital assets and resources (including various entities described in connection with the transaction platforms and systems described herein and in the documents incorporated herein by reference) that may be involved in a set of transactions (such as bilateral or multilateral transactions involving the enterprise, as well as ones enabled by a set of marketplaces, exchanges or the like with which an enterprise interacts) via a set of network resources. The enterprise may have control (e.g., direct control), management authority, and/or rights to use or access a set of digital assets that are presented to or accessible via the access layer. In embodiments, an enterprise access layer is capable of simplifying transactions for an enterprise (such as reflecting "consumerization") because it allows an enterprise to interface with multiple markets, marketplaces, exchanges, and/or platforms (e.g., relating to different business segments) through a common point of access.

One advantage of an enterprise access layer is that it may be configured to operate in conjunction with technologies that enterprises deploy in their own environments (i.e., on their private networks, including on-premises and cloud resources and platforms). This may include a wide range of software applications, programs and modules, services and microservices, and the like, including blockchains, distributed ledger technology (DLT), decentralized applications (dApps), intelligent agents, robotic process automation systems, and a wide variety of big data, analytics and artificial intelligence systems. In one non-limiting example, as enterprises deploy DLT and/or dApps, many enterprises will likely want this technology to assimilate with the other systems, structures and workflows of the enterprise.

Throughout an enterprise, different entities may have different roles and responsibilities that can result in varying levels of permission and/or access to enterprise resources. For example, a human resource employee is unlikely to be able to access machinery or equipment of a manufacturing engineer for the same business. Similarly, it is not likely that the manufacturing engineer can access other employee's personnel files like the human resource employee. Based on such differences, technology deployed internally for an enterprise is likely to have some level of permissioning. In embodiments, an enterprise may prefer for the permissioning of technologies like DLTs and dApps to be similar to or aligned with the physical resource access that is customary to a particular role. For example, when a resource is authenticated and stored on an enterprise's blockchain, that human resource employee would not be an authentication stakeholder for an operations-based resource (e.g., a manufacturing resources), or vice versa.

Generally speaking, a permissioned distributed ledger (e.g., a blockchain) refers to a ledger design where the ledger is not open for everyone to participate in a similar manner like a permissionless ledger (e.g., a public blockchain). Rather, a permissioned ledger may be configured such that participants have particular control/access rights. Enterprises may tend to deploy permissioned systems in their private networks to have access safeguards for enterprise resources while public distributed ledgers attempt to be wholly decentralized and allow anyone to participate with the ledger. For example, enterprises may prefer to deploy permissioned systems because these systems can shield sensitive information, ensure member compliance, and ease the rollout of particular, member-level deployments such as updates and reconfigurations.

FIG. 231 is an example of a general structure for an enterprise ecosystem 23100. In embodiments, the enterprise ecosystem 23100 is an ecosystem where marketplace participants 23110 are able to utilize public or third-party services 23120 to interface with an enterprise 23200 via an enterprise access layer (EAL) 23300. In some embodiments, the market participants 23110 may be any entity that interacts with the enterprise 23200, such as buyers, sellers, vendors, suppliers, manufacturers, service providers, partners, distributors, resellers, agents, retailers, brokers, promotors, advertisers, clients, escrow agents, advisors, customers, bankers, insurers, regulatory entities, hosts (e.g., of marketplaces, exchanges, platforms or infrastructure, among others), logistics and transportation providers, infrastructure providers, platform providers, and others (including various entities described elsewhere herein and/or in the documents incorporated by reference herein). As shown in FIG. 231, some market participants 23110 may be buyers 23112 (also referred to as purchasers or customers) when the enterprise 23200 is the asset provider (e.g., the enterprise is the selling, giving, or sharing party). Market participants 23110 may also be sellers 23114 (also referred to as venders or providers) when the enterprise 23200 is the receiving party or asset acquirer.

The EAL 23300 may be configured to interact with the market participants 23110 (and the ecosystem(s) in which they interact) in a variety of ways. For example, the EAL 23300 may be integrated or associated with one or more marketplaces 23122 such that the EAL 23300 functions as its own market participant on behalf of the enterprise 23200. By being associated with potentially numerous marketplaces (e.g., marketplaces that correspond to the type or nature of the enterprise assets), the EAL 23300 can perform complex or multi-stage transactions with enterprise assets (e.g., in a series or sequence of timed stages, simultaneously in a set of parallel transactions, or a combination of both).

In an example of a multi-stage transaction, the enterprise 23200 may perform a sequence of transactions. For example, the sequence of transactions may be for the purpose of acquiring or accessing a resource from another source (e.g., one of the sellers 23114). For instance, the enterprise 23200 demands resource ALPHA. However, the enterprise 23200 may not have any assets that are directly exchangeable for resource ALPHA. Therefore, the EAL 23300 may be configured to recognize how to acquire one or more assets that are exchangeable for resource ALPHA using the available digital assets of the enterprise 23200. To illustrate, the enterprise 23200 may have resources BETA and GAMMA. To acquire resource ALPHA, the EAL 23300 identifies that resource DELTA is directly exchangeable for resource ALPHA. In this example, the EAL 23300 may perform transactions with BETA and GAMMA to acquire DELTA in order to finally acquire resource ALPHA. For instance, the EAL 23300 exchanges resource BETA with a first asset source for resource EPSILON and then is able to exchange both resources GAMMA and EPSILON for resource DELTA from a second asset source. With the acquisition of resource DELTA, the EAL 23300 exchanges resource DELTA with a third asset source for resource ALPHA. Without an EAL 23300, acquiring resource ALPHA may be rather difficult because it demands access to multiple sources (e.g., across multiple marketplaces) and mapping how resources associated with those sources can be leveraged to obtain a target resource. Yet with the EAL 23300 that has access to multiple marketplaces 23122 and marketplace participants 23110, the EAL 23300 can configure and/or execute a transaction sequence or routine that maps how to obtain the target resource (e.g., resource ALPHA). This may occur regardless of relationship between marketplaces 23122 and/or marketplace participants 23110 such that the EAL 23300 may leverage disparate and independent markets to perform a transaction for a target resource. In other words, resource E may be offered or available in a marketplace 23122 that is a different and distinct marketplace 23122 from the marketplace 23122 that offers the target resource, resource ALPHA.

In embodiments, elements of a multi-stage sequence may be conditional, such that a contingent condition must be satisfied in order for a later stage to commence after completion of a prior stage. Conditions may include ones based on pricing, timing, and other transaction parameters.

In addition to marketplaces 23122, the EAL 23300 may interact with marketplace participants 23110 via third-party systems 23124 (some or all of which may be implemented as third-party services). Some examples of third-party systems 23124 include various financial services/systems such as operated by banks, insurers, lending institutions, valuation services, trading services, or escrow services, authentication services/systems, auditing services/systems, security system/services, etc.

In some examples, the market participants 23110 and/or marketplaces 23122 may use or be associated with a storage system 23126 (which may be implemented as a storage service). In some configurations, the storage system 23126 may include an append-only persistent storage system such as a blockchain (e.g., as labelled in FIG. 231). An append-only persistent storage system refers to a storage system that, when storing data, appends blocks of the newest data to be stored to the most recent block previously stored. In this sense, the chain of storage blocks may function as a time sequence, which may be cryptographically secured to form an immutable time sequence. This structure may be advantageous because someone who has access to the storage system may be able to determine a history of data storage transactions with relative ease. A blockchain storage system may be a permissionless storage system that is open to all of its members (e.g., all or some portion of participants 23110 in a marketplace 23122) or a permissioned storage system depending on the nature of the marketplace 23122 or the third-party system 23124 associated with the storage system 23126.

As described previously, the enterprise 23200 may include enterprise devices 23220 (e.g., enterprise equipment such as user devices, on-premises, cloud and other network infrastructure, general and/or specialty processors (e.g., edge processors), internet of things (IOT) and industrial internet of things (IIoT) devices), systems, processes, etc.) that generate, interface, or generally impact enterprise resources 23210. As with the non-enterprise aspect of the enterprise ecosystem 23100 (i.e., the market-participant side 23104 shown in FIG. 231), in some examples the enterprise 23200 includes one or more private append-only storage systems 23240 (e.g., a private blockchain). The storage system 23240 may be considered private in that the enterprise 23200 controls the access and permission for the private storage system 23240. For example, the private storage system 23240 may be only accessible to devices that have access to a private network associated with the enterprise 23200, such as a WAN. In some implementations, the enterprise 23200 has more than one private blockchains in order to tailor to, for example, the organizational structure of the enterprise 23200. For instance, the enterprise 23200 has one private blockchain that corresponds to a storage system for operations or a product-generating portion of the enterprise 23200 and another private blockchain that corresponds to storage systems for administrative portions of the enterprise 23200. As another example, the enterprise 23200 has a single blockchain with a set of sidechains for components or organizational units of its organizational structure.

In addition to a private blockchain, the enterprise 23200 may include a set of enterprise data stores 23230. When compared to a blockchain, a data store refers to a set of data storage types that is not limited to an append-only persistent data storage structure. Rather, an enterprise data store 23230 may be any one or combination of a relational database (e.g., a structured query language (SQL) database), a non-relational database (e.g., a non-SQL database), a key-value store (i.e., a map from keys to values), a full-text search engine, a distributed database, a set of network-attached storage resources, a message queue or other data storage system or service of any of the many types described herein or in the documents incorporated by reference herein.

The data store 23230 may store enterprise data that is obtained from enterprise resources 23210 or from other various data sources 23250 of the enterprise 23200. For example, FIG. 232 depicts that the enterprise 23200 may include internal or private enterprise systems that generate data specific to the enterprise 23200 (i.e., enterprise data). Some examples of these private enterprise systems that at least partially function as data sources 23250 include enterprise resource planning (ERP) systems, customer relationship management (CRM) systems that contain customer-related information, healthcare systems, supply chain systems (e.g., supply chain management (SCM) systems) that include inter-organizational supply chain information, product life cycle management (PLM) systems that include product or service lifecycle information (e.g., data characterizing items, parts, products, documents, product/service requirements, engineering change orders, and quality information), accounting systems, research and development systems, and HR systems, and/or the like.

In some examples, as shown in FIG. 232, the enterprise 23200 includes a set of analytical systems 23260. These analytical systems 23260 may refer to tools deployed by the enterprise 23200 to perform analysis for various processes or systems associated with the enterprise 23200. For instance, an enterprise 23200 may find it pertinent to their operations to perform market analytics (e.g., for advertising, new product development, and/or marketing purposes). Another type of analytics that the enterprise 23200 may perform is demographic analytics. Demographic analytics may aid an enterprise to understand relevant demographic, psychographic, location, behavioral and other information about customers, venders, employees, potential employees, or a target marketplace. For instance, an enterprise 23200 uses demographic analytics to determine how a new product can reach a particular target demographic or how an existing product/service is perceived by various demographics. Additionally or alternatively, to market analytics and/or demographic analytics, the analytical system 23260 of the enterprise 23200 may be configured to perform an array of statistical analysis. This statistical analysis may be used to support many different activities throughout the enterprise 23200 including analytics performed by other systems of the enterprise 23200 or of the analytical system 23260 itself (e.g., supporting the market analytics, the demographic analytics, or any of a wide variety of other analytics described herein or in the documents incorporated by reference herein).

FIGS. 231 and 232 illustrate examples of the EAL 23300. In both of these examples, the EAL 23300 is shown to include a number of EAL systems (also referred to modules or EAL modules) that enable the functionality of the EAL 23300. In some examples, these EAL systems are deployed in a container that is specific to the EAL 23300. When deployed in a container for the EAL 23300, this containerized instance means that the EAL 23300 includes the necessary tools and computing resources to operate (i.e., host) the EAL systems without reliance on other computing resources associated with the enterprise 23200 (e.g., computing resources such as processors and memory dedicated to the EAL 23300). For example, the container for the EAL 23300 may include a set of one or more systems, such as software development kits, application programming interfaces (APIs), libraries, services (including microservices), applications, data stores, and/or processors or the like to execute the functions of the EAL systems that may enable the EAL 23300 to provide enterprise asset transactional management and other functions and capabilities described throughout this disclosure. References herein to "EAL systems" should be understood to encompass any of the foregoing except where context dictates otherwise.

In some implementations, a set of the EAL systems leverages computing resources considered to be external to the EAL 23300 (e.g., separate from computing resources that have been dedicated to the EAL 23300, such as, in embodiments, computing resources shared with other enterprise applications or systems). In these implementations, the set of EAL systems leveraging external computing resources may be in communication with computing resources specific to the EAL 23300. This type of arrangement may be advantageous when one or more of the EAL systems are computationally expensive and would increase the computational requirements for an entirely contained EAL 23300, such as when one or more of the EAL systems causes the EAL 23300 to be a relatively expensive EAL deployment. For instance, an arrangement leveraging external (e.g., shared) systems may be beneficial for EAL systems that are infrequently utilized. To illustrate, a first enterprise may rarely use an EAL system, such as a reporting system. Here, instead of ensuring that the EAL 23300 has the computational capacity to support a reporting system by itself, the enterprise 23200 configures the reporting system to be hosted by and/or supported by computing resources external to the EAL 23300 to deploy a relatively lean form of the EAL 23300 (i.e., an EAL container that does not include resources dedicated to a reporting system or that includes only limited resources dedicated to the reporting system with the capability to access additional, external resources as needed).).

In some configurations, the EAL 23300 or a set of the EAL systems leverages computing resources considered to be external to the EAL 23300 for support. An example of this support may be that the EAL 23300 or the set of EAL systems demands greater computing resources at some point in time (e.g., over a resource intensive time period). For instance, greater being more computing resources than a normal or baseline operation state. In this example, for instance, the enterprises resource not dedicated to the EAL 23300 or EAL systems can assist or augment the services provided by some aspect of the EAL 23300. To illustrate, the EAL leverages enterprise resources to assist or augment the performance of analysis, such as managing and/or analyzing governance for health care data associated with clients of a particular enterprise.

In embodiments, the deployment of the EAL 23300 may be configurable. For example, the enterprise 23200 or some associated developer can function as a type of architect for the EAL 23300 that best serves the particular enterprise 23200. Additionally, or alternatively, the deployed location of the EAL 23300 may influence its configuration. For instance, the EAL 23300 may be embedded within an enterprise (e.g., non-dynamically) where it can be specifically configured using various module libraries, interface tools, etc. (e.g., as described in later detail). In some examples, the configuring entity is able to select what EAL systems will be included in its EAL 23300. For instance, the enterprise 23200 selects from a menu of EAL systems. Here, when an EAL system is selected by the configuring entity, a configuration routine may request the appropriate resources for that EAL system including SDKs, computing resources, storage space, APIs, graphical elements (e.g., graphical user interface (GUI) elements), data feeds, microservices, etc. In some implementations, in response to the request, the configuring entity can dedicate the identified resources of each selected EAL system. For instance, the configuring entity associates the dedicated resources to a containerized deployment of the EAL 23300 that includes the selected EAL systems.

Referring specifically to FIGS. 231 and 232, the EAL 23300 includes a set of eight EAL systems. The set includes an interface system 23310, a data services system 23320, an intelligence system 23330, a workflow system 23340, a wallet system 23350 (also referred to as a digital wallet system), a governance system 23360, a permissions system 23370, and a reporting system 23380. It should be noted that even though both FIGS. 231 and 232 include the set of eight EAL systems, the EAL 23300 may include any number of EAL systems (e.g., three systems, five systems, or seven systems, or any other suitable number of EAL systems). Additionally, although particular types of EAL systems are described herein, the functionality of one or more EAL systems is not limited to only that particular EAL system, but may be shared or configured to occur at another EAL system. For instance, in some configurations, some functionality of the wallet system 23350 may be performed by the data services system 23320 or functionality of the governance system 23360 may be incorporated with the intelligence system 23330. In this respect, the EAL systems may be representative of the capabilities of the EAL 23300 more broadly. In embodiments, the set of EAL systems involved in any particular configuration of the EAL 23300 may include any of the systems described throughout this disclosure and the documents incorporated by reference herein, such as systems for counterparty discovery, opportunity mining, automated contract configuration, automated negotiation, automated crowdsourcing, automated facilitation of robotic process automation, one or more intelligent agents, automated resource optimization, resource tracking, and others.

The interface system 23310 is an EAL system that communicates on behalf of the EAL 23300 and/or enables communication with the EAL 23300 by one or more entities, which may include human operators and/or machines. To communicate on behalf of the EAL 23300, the interface system 23310 is capable of communicating with some or all portions of the enterprise 23200 (e.g., enterprise devices 23220, representatives of the enterprise 23200, and/or private storage systems 23240 of the enterprise 23200). In some examples, to communicate with the enterprise 23200, the EAL 23300 is configured with access rights to the private network of the enterprise 23200. With access to the private network of the enterprise 23200, the interface system 23310 can function as a communication conduit to call a system or device of the enterprise 23200 in order to support another EAL system.

Additionally, the interface system 23310 enables there to be a central communication hub that members of an enterprise 23200 may use to engage with functions of the EAL 23300. For instance, a business unit decides to offer an enterprise resource 23210 as a digital enterprise asset that is available to market participants 23110. Here, a member of the enterprise 23200 or an enterprise device 23220 responsible for the enterprise resource 23210 communicates the enterprise resource 23210 to the wallet system 23350 via the interface system 23310.

As a central communication hub, the interface system 23310 may also function as a communication means that the EAL systems use to communicate with endpoints at the enterprise side (e.g., shown as an enterprise-side 23102 in FIG. 231) or the market participant side (e.g., shown as the market-side 23104 in FIG. 231). For example, the interface system 23310 operates in conjunction with the EAL systems of the EAL 23300 to ensure that the interface system 23310 includes the appropriate APIs, links, brokers, connectors, bridges, gateways, portals, services, data integration systems or other means of translating communications (e.g., data packets or data messages) of intra-EAL systems (e.g., between EAL systems) and/or from the EAL systems to an endpoint on either of the enterprise side (e.g., an enterprise device) or market participant side (e.g., a marketplace 23122, the storage system 23126, or marketplace participant 23110). For example, among many others, the interface system 23310 may have an API that the enterprise 23200 uses to receive or to obtain reports from the reporting system of the EAL 23300.

As shown in FIG. 232, the interface system 23310 may include capabilities such as authentication and/or security protocols as a means to enforce who has the ability to use the EAL 23300. For instance, an entity that is able to use to use the EAL 23300 may receive credentials that indicate the entity's access permission(s) with respect to the EAL 23300. These credentials may be login credentials, an authentication token, digitized cards/documents, biometric feature(s), one-time passwords, or any other information that functions as proof that the entity has a right to access the EAL 23300 via the interface system 23310. In embodiments, credentials may be managed by an identity-as-a-service platform or other identity management systems. It is appreciated that authentication of an entity may include authentication of human users and/or to specific devices/software systems that are authorized to interact with the EAL 23300.

In some examples, the credentials issued to an entity are configured to identify the access rights of the entity. When the credentials identify the access rights of the entity, the interface system 23310 may be able to determine the access rights and tailor which portions of the interface system 23310 that the entity can access. In embodiments, the interface system 23310 is capable of restricting portions of various interfaces or communication channels to EAL systems of the EAL 23300 using the information contained or indicated by credentials that have been associated or issued to an entity.

The data services system 23320 refers to an EAL system that performs data services for the EAL 23300. Data services may include data processing and/or data storage. This may range from more generic data processing and data storage to specialty data processing and storage that demands specialty hardware or software. In some examples, the data services system 23320 includes a database manager to manage the data storage services provided by the data services system 23320. In some configurations, the database manager is able to perform management functions such as querying the data being managed, organizing data for, during, or upon ingestion, coordinating storage sequences (e.g., chunking, blocking, sharding), cleansing the data, compressing or decompressing the data, distributing the data (including redistributing blocks of data to improve performance of storage systems) and/or facilitating processing threads or queues, and the like. In some examples, the data services system 23320 couples with other functionality of the EAL 23300. As an example, operations of the data services system 23320, such as data processing and/or data storage, may be dictated by decision-making or information from other EAL systems such as the intelligence system 23330, the workflow system 23340, the wallet system 23350, the governance system 23360, the permissions system 23370, the reporting system 23380, and/or some combination thereof.

In some implementations, the data services system 23320 includes encryption/decryption capabilities that pair with the data processing/storage. For instance, the data services system 23320 may decrypt data when encrypted data is retrieved from its data store(s). In other situations, the data services system 23320 may encrypt data that is being used, processed, and/or stored at the EAL 23300. For instance, the data services system 23320 receives data to be stored, determines that the received data includes one or more characteristics that satisfy an encryption rule, and encrypts the data prior to, during, or after the data is transferred to a storage location. In this respect, the data services system 23320 may receive an encryption or decryption request that specifies data associated with the data services system 23320 and the data services system 23320 is capable of fulfilling the request and providing the encrypted/decrypted data to the requesting entity. The data services system 23320 may be configured to provide symmetrical encryption, asymmetrical encryption, or other suitable types of encryption. Some encryption algorithms that the data services system 23320 may use are Advanced Encryption Standard (AES), Rivest-Shamir-Adleman (RSA), and variations of Data Encryption Standard (DES) (e.g., 3DES), among others. Additionally or alternatively, the data services system 23320 may also perform hashing or other cryptographic functions to verify data that it manages for the EAL 23300.

The intelligence system 23330 of the EAL 23300 functions to provide intelligent functionality to the EAL 23300. Among other aspects, the intelligence system 23330 is a system that the EAL 23300 can utilize for decision-making regarding transactions for enterprise digital assets. For instance, the intelligence system 23330 may recruit and/or coordinate a set of EAL systems (e.g., including enterprise sources) as necessary to provide a set of outputs in response to one or more intelligent requests (i.e., decision-making request). Some intelligent or decision-making functionality that the intelligence system 42230 is capable of providing includes peer or counterparty discovery (i.e., identifying parties for a transaction, such as one using enterprise assets or assets that are desired to be acquired by or for an enterprise, among others), automated asset allocation and position maintenance (e.g., automated acquisition or disposition of assets to maintain a desired allocation of assets across asset classes, such as to maintain a desired balance of risk and return across the asset classes), automated asset management (e.g., determining which wallets of the wallet system that an available enterprise asset should be associated with), automated transaction configuration (e.g., assembling smart contract and/or smart contract terms for a set of digital asset transactions), automated negotiation of transaction terms, automated settlement (e.g., by execution of on-chain transfers), modeling or analysis of a set of transactions or a transactions strategy, forecasting or predicting asset or transaction parameters (e.g., prices, trading volumes, trading timings, etc.), automated prioritization (e.g., prioritization of transactions among a set of transactions, of assets among a set of assets, of workflows (e.g., prioritizing a set of workflows among others for access to available resources of the EAL 23300), configuration of transaction timing, and/or automated management of a set of policies (e.g., enterprise governance policies, regulatory or legal policies, risk management policies, and others).

In embodiments, the intelligence system 23330 is capable of learning from prior transactions to inform future transactions. To have this learning capability, the intelligence system 23330 may include a set of learning models that identify data and relationships in transactional data, such as transactional training data set consisting of historical training data (which, in embodiments, may be augmented by generated or simulated training data). Models may include financial, economic, econometric, and other models described herein or in the documents incorporated by reference herein. Learning may use an expert system, decision tree, rule-based workflow, directed acyclic workflow, iterative (e.g., looping) workflow, or other transaction model. Some examples of learning models include supervised learning models, unsupervised learning models, semi-supervised learning models, deep learning models, regression models, decision tree models, random forest or ensemble models, and the like. Learning models may use neural networks (e.g., feedback and/or feed forward neural networks, convolutional neural networks, recurrent neural networks, gated recurrent neural networks, long short-term memory networks, or other neural networks described in this disclosure or in the documents incorporated herein by reference). Learning may be based on outcomes (e.g., financial yield and other metrics of enterprise performance), on supervisory feedback (e.g., from a set of supervisors, such as human experts and/or supervisory intelligent agents), or on a combination.

In some examples, the learning models of the intelligence system 23330 may train using enterprise data that relates to transactions for digital enterprise assets. In this case, training data sets may be proprietary to the enterprise. By having enterprise specific training data sets (i.e., with enterprise training examples), the enterprise 23200 learns how to predict transactional behavior with data tailored specifically to the enterprise 23200 and characteristics of its assets (such term including, except where context indicates otherwise, assets controlled by the enterprise as well as other assets that may be involved in the workflows of the enterprise, such as assets being pursued for acquisition, borrowing, lending, or the like). In some examples, the learning models may train first from a larger corpus of training data (e.g., public training data set) and then undergo a fine-tuning process that trains with a specialized data set that is particular to digital enterprise assets. In these examples, the weights or biases that are configured during the first stage of training with the larger corpus may then be fine-tuned or adjusted during the second stage. In some examples, the fine-tuning of the second stage also assists to prune nodes that have low impact on enterprise-specific data that would not have been pruned by solely training with the larger corpus. In other words, the enterprise-specific data of the second stage of training that fine-tunes the model reduces nodes that do not influence (e.g., the probability) a transaction event regarding an enterprise digital asset.

In some configurations, the intelligence system 23330 includes one or more modules that function to gather data for purposes of training a model of the intelligence system 23330. For example, the intelligence system 23330 includes data pipelines that include data that characterizes digital enterprise assets that are available in a wallet system (e.g., the wallet system 23350), data that characterizes historical, current or predicted state/status data about entities involved in enterprise transactions or workflows, data that characterizes historical, current or predicted state/status data about enterprise assets or resources, or the like. In some examples, these modules that function to gather data for purposes of training a model of the intelligence system 23330 gather, derive, or generate training data from information associated with one more EAL systems. For instance, the training data may be governance/compliance information, such as rules, that can be used to develop models that provide decision-making compliance or predictive compliance. In this example, the governance/compliance data may be translated into enterprise-specific data for the second state of training when the governance/compliance data is specific to the enterprise.

In some implementations, each model, module, service, or the like of the intelligence system 23330 may correspond to a particular marketplace 23122 or type of marketplace 23122. For instance, the training data to train a marketplace's specific model may consist of transactional data for that marketplace 23122 or type. By having a model that is specific to a particular marketplace 23122 or type, the model can be capable of predicting transactional information or transactional events for the marketplace 23122 or type. Therefore, the EAL 23300 can leverage the prediction from the model to inform transactional actions for a digital enterprise asset available to the particular marketplace 23122 or type.

In embodiments, the intelligence system 23330 may include search functionality, such as enabling searching for assets within a wallet of the enterprise or searching within other data resources of the enterprises for assets that may be appropriate for inclusion in the wallet. The search function may use similarity algorithms (e.g., k-means clustering, nearest neighbor algorithms, or others) to discover assets that may be of interest by virtue of similarity to other transacted assets and/or ones presented in a wallet. A search algorithm may be trained, such as based on outcomes of transactions or enterprise or user actions, to identify relevant assets for wallet inclusion and or to identify relevant assets within a wallet for a possible transaction. In embodiments, the search functionality may enable recommendations, such as recommendations of assets for inclusion in wallet, for inclusion in a transaction, for presentation, or the like. Recommendations may, in embodiments, be based on algorithms, including clustering and similarity algorithms that recommend similar transactions to similar parties or the like, collaborative filtering algorithms in which users indicate preferences as to types of assets or transactions and based thereon are associated with other similar users whose actions and transactions inform recommendations, deep learning algorithms, that are trained on transaction outcomes, and many others.

In embodiments, the intelligence system 23330 may facilitate prioritization, such as by alignment of functions and capabilities according to a set of prioritization rules, such as rules that prioritize certain enterprise entities (such as particular workgroups), that prioritize certain types of transactions (such as time-sensitive trading versus long-term resource acquisition), or the like. In embodiments, the prioritization rules may be linked to and/or derived from a set of enterprise plans, such as strategic plans, resource plans, or the like. This may include optionally translating a set of strategic or resource goals into a set of priorities that are applied as rules to transactions. In embodiments, prioritization rules are dynamically and automatically updated based on changes to resource plans, strategic plans, or the like by virtue of integration between the intelligence system 23330 and one or more enterprise planning systems. For example, if a resource plan indicates a need to acquire a critical input resource for an operating function, the intelligence system 23330 may prioritize discovery of candidate sources for that resource. As another example, if a strategic plan indicates a need to dispose of an asset to reduce exposure to market volatility, the intelligence system 23330 may prioritize presentation of the asset in wallet or other interface in order to facilitate rapid disposal of the asset.

Additionally, or alternatively, the intelligence system 23330 may be capable of configuring other EAL systems (e.g., via an intelligence service controller shown in FIG. 232). For example, the intelligent functionality of the intelligence system 23330 may provide configuration details or configuration inputs to other EAL systems. When the intelligence system 23330 configures other EAL systems, the intelligence system 23330 enables the EAL 23300 to operate autonomously or semi-autonomously. That is, the EAL 23300 is capable of operating without human intervention (i.e., autonomously) such that the EAL 23300 coordinates, controls, and/or executes transactions regarding digital enterprise assets on its own accord. Configuration itself may be autonomous, such as using robotic process automation (where an agent is trained to undertake configuration based on training on a set of expert configuration actions), by learning on outcomes, or by other learning processes described herein or in the documents incorporated herein by reference.

In some configurations, a set of models of the intelligence system 23330 functions to predict or recommend configurations for other EAL systems of the EAL 23300. That is, each EAL system may have a configuration protocol that includes parameters that enable a respective EAL system to perform a particular function. Here, a model of the intelligence system 23330 may be trained to generate an output that serves as a configuration parameter for an EAL system. In this respect, one or more models of the intelligence system 23330 may be used to generate predictions or recommendations to configure one or more EAL systems to perform a particular transaction for an enterprise digital asset. Prediction of configuration of one EAL system can be used in the configuration of another EAL system, such as to harmonize configurations across the systems (e.g., to allow development of a logical or efficient sequence of transactions that are governed by the respective systems, to allow effective coordination of EAL resource utilization, to avoid conflicts (e.g., where different systems seek to undertake inconsistent actions with respect to the same resource or asset), or the like. Additional examples of intelligence systems and services are described elsewhere in the disclosure.

In embodiments, a workflow system 23340 is another EAL system of the EAL 23300. A workflow system 23340 generally refers to a platform that combines several discrete workflow tools into a single application that automates processes involving machine and/or human tasks (e.g., in a linear sequence). The workflow system 23340 may integrate with other systems (e.g., EAL systems) using APIs or via the interface system 23310. To automate workflow processes, the workflow system 23340 may include workflow definitions, workflow libraries, workflow optimization, and/or workflow management. For example, workflow definitions define the workflows involved with any number of subject processes. For example, a definition sets forth a series of tasks or actions to be performed in a sequential manner to achieve a target end goal. Workflows may be linear (such as involving an invariant sequence of steps), contingent (such as following a decision tree through a series of decision points that depend on inputs, such as defined by a directed, acyclic graph), looping/iterative (such as where steps are repeated until a threshold, goal or other conclusion is met), or a combination of the above. Workflow management tools may provide an infrastructure for the set-up, performance, and/or monitoring of a sequence of tasks that define a given workflow. In some configurations, the workflow system includes a process builder that functions to build an automated process flow based on pre-defined or configured business rules, transaction models, or the like. In some examples, the workflow management includes form(s) designed to automate feedback or to generate dynamic data input from a workflow or task within a sequence of the workflow. In some instances, the workflow management functions as a workflow engine that runs a workflow system and/or makes decisions about the workflow automatically based on workflow rules. That is, the workflow management may execute the process built by a process builder. In some instances workflows may be associated with policies, such that a policy is attached to and/or embedded into the workflow as a whole, or into individual steps of the workflow. This may include access policies (e.g., which enterprise entities are permitted to view, initiate, modify, terminate, or otherwise interact with workflow), resource utilization policies (e.g., what resources a workflow can access, how and when), prioritization policies (e.g., to resolve competition among workflows for resources), risk management policies, compliance policies, and many others. Policies may include enterprise governance policies, legal or regulatory policies, risk management policies, and many others. In embodiments, policies may also be embedded into or linked to processing nodes of the EAL, such that the processing node of an EAL resource is aware of the conditions under which it may be used, such as contextual conditions (including transaction and market conditions), network status conditions, and many others. In embodiments, workflows or other EAL processes or functions may be automatically governed or managed based on an enterprise resource plan or enterprise strategic plan, such as via linking to, receipt from, or integration with an enterprise resource planning (ERP) system, such as where an EAL process or service only remains available for use within a budgeted or planned level of utilization, or where a process, service, or workflow is prioritized based on a set of priorities embedded in a strategic plan, or the like.

In embodiments, a wallet system 23350 is an EAL system that supports digital transactions. The wallet system 23350 (also referred to as a "wallet" or "digital wallet") can function in many ways akin to a storage device while also including increased functionality that allows it to interface with other systems (e.g., EAL systems) especially digital or electronic systems. To support digital transactions, in some implementations, the wallet system 23350 is configured to hold or to contain (e.g., store) digital assets, such as enterprise digital assets, such as digital objects, tokens, or the like. In some examples, the wallet system 23350 functions as an index for digital assets such that the wallet system 23350 represents the status of digital assets without having to store them. When used as an index, the wallet system 23350 may point to or reference the actual storage location of the digital asset (such as a bank account, stock exchange, custodial account, blockchain, distributed database, or the like). For instance, a digital asset that is available for exchange in the wallet system 23350 may be actually stored in data storage of the data services system 23320. Here, the wallet system 23350 may include some indication that the digital asset is available for exchange (e.g., an asset availability tag) along with information that the digital asset is stored in the data services system 23320 (e.g., a storage location identifier) so that the digital asset can be retrieved from the data services system 23320 to perform a transaction.

In some configurations, the wallet system 23350 also contains the digitization of identity data. For instance, the wallet system 23350 may hold identity data such as banking numbers, card numbers, coupons, tickets, credentials, tokens, tokenized assets, vital records, biometric data, passwords, private keys, licenses, etc. For the enterprise 23200, this identity data may refer to identity information about the enterprise 23200 or information about one or more parties associated with the enterprise 23200 that is/are responsible for a respective digital asset. For instance, the identity data associated with an asset that is available in the wallet system 23350 identifies information such as the employee at the enterprise 23200 who made the digital asset available (e.g., an employee number or an employee name) or a department or business unit that the digital asset originated from at the enterprise 23200 or who is responsible for the digital asset. Identity data may be associated with an identity management system or service, an identity-as-a-service platform, or the like. Identity data for the enterprise may be managed based on a structure that represents a set of roles, such as an organizational chart, such as represented by a graph structure (optionally stored in a graph database) pursuant to which some roles are governed by other roles. For example, access layer access policies and other capabilities may be based on the position of a role within a hierarchy, such that access and other capabilities for a role that reports to another role are governed by the entity that holds supervisory role. Role-based governance of workflows allows access policies to be implemented based on the enterprise structure and rapidly updated in cases where the structure changes (e.g., a reorganization) or where individuals change roles.

The wallet system 23350 is also capable of managing, associating, or generating various date code information for a digital asset. For instance, the wallet includes a date code that defines the time at which the digital asset was created, a set of date codes for a window of availability for the digital asset, a date code that designates when the digital asset was made available or added to the wallet, etc.

A wallet system 23350 generally includes at least one wallet as a storage resource (e.g., a partitioned container, a set of files, and/or a set of databases) for digital/electronic information. In this respect, a wallet may be software-based and referred to as a software wallet or physical hardware and referred to as a hardware wallet (e.g., a dedicated hardware storage device or location within a hardware device—a hardware wallet). Digital wallets, to some degree, have been used with cryptographic currency systems (also referred to as cryptocurrency). In such cases, a digital wallet may provide or serve as a digital ledger that includes references to the assets that are associated with the wallet, rather than being the actual holder of the asset. For instance, enterprise digital assets may be actually stored on a private storage system associated and/or controlled by the enterprise 23200. Here, if one of these enterprise assets is associated with a wallet (e.g., made available to market participants via a wallet), instead of transferring the digital asset to the wallet during or following the association (e.g., moving the asset to a storage location dedicated to a wallet), the asset may remain in the private storage location while the wallet includes a record (e.g., an entry in a ledger) of the private storage location. In this configuration, the wallet maintains some type of storage address or identifier of the storage location for the asset (e.g., a type of pointer), In digital transactions (e.g., wallet-based transactions), there does not necessarily need to be any movement of digital assets (e.g., a change of possession to pair with a change of ownership). Rather, the ownership or controlling information associated with a digital asset can change from one owner to another owner using data entry procedures. For instance, when a digital asset is exchanged from a first entity to a second entity, the ownership information associated with the digital asset is changed from the first entity to the second entity. This change may occur by either overwriting the ownership information in data storage (e.g., a database) or by appending data to non-overwriting storage (e.g., adding blocks to sequential blockchain storage, such as in a distributed ledger that maintains transaction records that indicate ownership transfers and other transaction details), in each case akin to deed or title recordation in tangible property, where the deed or title registry is a transaction ledger records a new deed event or record at a later time such that a timeline of the deed events can inform someone as to the changes in ownership over time. A blockchain for digital assets can function similarly such that there is a first block at a first time that indicates that the first entity owned the digital asset and then, when the digital asset is digitally "exchanged," there is a second block generated at a second time later than the first time that indicates that the second entity owns the digital asset. Accordingly, a query for information related to the digital asset (e.g., ownership information) would return two records that indicate a change of ownership from the first entity to the second entity. In this sense, when the word "exchange (d)" is used with respect to a digital asset, it can mean that the ownership or controlling information of a digital asset is modified without necessarily moving the digital asset in any way. While the asset may remain in place, control may pass to the different owner; for example, an asset may subsequently be managed (e.g., transferred) only by the valid owner who possesses the private key that is needed to initiate a transfer. However, it is also still possible that the "exchange" of a digital asset can encompass some form of digital or physical movement, such as changing the physical storage locations for the digital asset, such as by locating the digital asset in a wallet or other storage location where only the owner of the wallet or storage location has the ability to interact with or transfer the asset.

When the wallet system 23350 creates or initializes a wallet, that wallet may be unique from other wallets in that it has its own set of unique digital keys. In some examples, the wallet system 23350 or another system of the EAL 23300 may generate the set of unique keys for the wallet when the wallet is created or configured. These digital keys can allow the functionality of the wallet to act on behalf of a specific entity (e.g., the enterprise or an enterprise entity, or a set of roles within the enterprise) to perform or orchestrate digital transactions. In other words, to execute a digital transaction such as an ownership change, a unique key associated with wallet signs off ownership to the wallet's address that is dictated by another key (e.g., a key that is cryptographically related to the unique key signing off ownership). In this sense, digital keys are able to serve as ownership attestation such that trust, control, and security is present for a digital transaction. These digital keys may be independent (e.g., completely independent) of other digital protocols and can be generated with or without consideration for particular storage schemes (e.g., agnostic to a particular storage structure like a blockchain or designed for a particular storage structure). Digital keys may be managed by a key management platform, may be based on identity of users (e.g., identities of a set of roles, such as in a hierarchy of roles), and the like.

As an example, with wallets configured for cryptocurrencies, the set of digital keys functions as secure digital codes needed to interact with a blockchain. Here, for instance, the blockchain stores the currency and the wallet uses one or more keys from the set (e.g., a public key) to locate the currency stored on the blockchain that is associated with the wallet (e.g., to locate the currency with the wallet's address). With the location of the currency, the wallet or an entity facilitating the wallet may perform actions using the currency (e.g., exchanging the currency) and authorize those actions with one or more keys from the set. For example, the wallet performs transactions with the assets and records those transactions on the blockchain or some other digital ledger by using the set of keys. In this sense, digital keys can function as an account and/or an identity to authorize the wallet to perform actions (e.g., on behalf of an entity).

In some examples, each wallet is associated with a pair of cryptographic keys as the set of digital keys. In these examples, one key of the pair may be considered a public key while the other key is considered a private key. Here, a public key refers to a cryptographic key (e.g., an alphanumeric string) associated with a particular entity (e.g., a wallet) that is outward facing such that it may be published and shared with other entities to function as a public unique identifier or address for the particular entity. In other words, the public key may be associated with a digital asset to indicate publicly (or to those who can view the digital asset) who or what controls and/or owns the digital asset. In contrast, a private key refers to a cryptographic key (e.g., an alphanumeric string) that is generally associated with the same entity of the public key, but is kept as a secret. Here, instead of an address function like the public key, the private key may serve as a form of digital signature (e.g., like a unique password) that proves that the entity associated with the key has the authorization to perform a transaction. In other words, the holder of the private key can serve as the controller for performing digital transactions.

The public and private key may be linked to each other in that the public key may be generated from the private key. For example, a random number generator (or alphanumeric generator) generates a private key of X length and then, from the private key, a one-way cryptographic function generates the public key. In some implementations, the public key and private key operate in tandem such that the public key provides an address or destination for the private key holder such that a market participant can request authorization of the private key holder to execute a transaction. In some examples, this cooperation is such that the public key assigned to a wallet must match or prove its relation to the private key to authenticate an asset transaction. Here, this matching may be considered a form of verification for the transaction. In these examples, the public key may be able to "match" or exhibit a relation with the private key because the public key has been generated from the private key.

In some configurations, the wallet uses a derivative form of the private key (e.g., a one-way hashing function) as a digital signature to authorize a transaction. Since the private key can authorize transactions on behalf of the owner/controller of a wallet, if a nefarious party obtained the private key, that nefarious party could remove or disassociate all of the assets from a wallet; thus, stealing assets. Therefore, the security of the private key for a wallet can be critical to the security of the assets associated with a wallet. For reasons such as this, it may be advantageous to authorize a transaction with a form (e.g., a cryptographic function) of the private key that indicates that the authorizer (e.g., the entity digitally signing a transaction with the form of the private key) has/controls the private key, but that does not reveal the actual private key to another party.

In some implementations, securing the authorizing key, such as the private key, depends on the security of the wallet itself. This may be the case when management and/or storage of the private key occurs at the wallet. For example, the wallet stores the set of keys including the private key. When a wallet stores the authorizing key, the wallet system 23350 may use a variety of security techniques to secure the authorizing key. For example, the wallet system 23350 may configure the wallet as a custodial wallet or non-custodial wallet. A custodial wallet generally refers to a wallet service where custody or digital possession of the wallet is outsourced to a third-party service who provides security for the wallet (or keys associated with a wallet). In some examples, to generate a custodial wallet, the wallet system 23350 transfers the one or more keys of the set of keys (e.g., the private key) to the custodian service provider. In some situations, custodial services may offer a greater degree of protection because a custodian service provider may have key security expertise. At the same time, the owner of the wallet (e.g., the enterprise 23200) has to trust the custodian with security responsibility. In some configurations, a custodian service provider may be considered the same as or akin to a key management service (KMS).

In contrast, a wallet may be a non-custodial wallet. A non-custodial wallet refers to a wallet that is not outsourced to a custodian service provider. An enterprise may prefer to use non-custodial wallets when, for example, the enterprise lacks trust in a custodial service provider or perhaps foresees there being a risk of censorship (e.g., limiting the type of transactions or transactions generally for some period of time) from a custodian service provider.

In addition to a wallet being custodial or non-custodial, a wallet may also be considered a "hot" wallet or a "cold" wallet. A hot wallet is a wallet that is connected to a gateway to perform transactions. For instance, the gateway is a wide area network (WAN) such as the internet and the hot wallet is a wallet that is connected to the internet. Some examples of hot wallets include web-based wallets, mobile wallets, and desktop wallets. Since a hot wallet is hot or online with the ability to perform transactions, a user of a hot wallet is able to directly issue transactions, for example to a blockchain, in a relatively easy fashion. For this reason, it may be preferable to use a hot wallet for keys that are frequently used for transactions or keys that have low risk of loss (e.g., keys used with only a particular threshold value of assets). Unfortunately, with this ease of use, the keys associated with the hot wallet are generally vulnerable to threat by the mere fact that they exist online (e.g., connected to the internet).

On the other hand, a cold wallet refers to a wallet that is kept off-line or disconnected from a gateway to perform transactions. By being disconnected from a gateway (e.g., the internet), the cold wallet minimizes potential vulnerability attacks. A cold wallet may any storage-capable device that is disconnected or offline from marketplace transactions (e.g., not connected to the internet) including a simple sheet of paper with the keys printed on the paper. When using a set of keys for a transaction that is stored in a cold wallet, the user may temporarily connect the cold wallet to the transaction gateway and provide the necessary keys prior to disconnecting the cold wallet from the gateway. Since a cold wallet is capable of being online, in some instances, what defines the cold wallet is that it is generally offline (e.g., offline a majority of the time) and/or offline at the time when a transaction is requested for an asset associated with the wallet.

In some situations, the user does not connect the cold wallet, but rather accesses the offline keys and transfers them manually or by a transfer operation (e.g., cut and paste) for execution of the transaction. In some configurations, the transfer operation copies the keys from a cold wallet to a hot wallet to perform the transaction. In these configurations, the keys transferred to the hot wallet may be assigned a time of life (e.g., a temporary lifespan to consummate the transaction) when transferred or otherwise undergo a removal procedure following the execution of the transaction such that the hot wallet does not retain the keys. In other configurations, a transaction may use a combination of a hot wallet and a cold wallet. For instance, the transaction is signed entirely on the cold wallet while the hot wallet is used to issue/relay the signed transaction (e.g., to the blockchain). Due to the nature of cold wallets, cold wallets may be better suited for keys that met a certain security threshold (e.g., a security clearance or designated authorization level) or for keys that are infrequently used.

In some examples, whether the wallet system 23350 uses a hot wallet or a cold wallet depends on the value of the asset associated (or to be associated) with the wallet. For instance, the enterprise 23200 may set a threshold asset value for an individual asset that, if exceeded, must be stored in a secure cold wallet rather than a hot wallet. Similarly, if the asset value is below the threshold asset value, the EAL 23300 may associate the asset with a hot wallet. In some examples, whether the wallet system 23350 uses a hot wallet or a cold wallet depends on the cumulative value of the assets that are to be available for a given wallet. In other words, rather than the threshold asset value being a threshold for the value (e.g., estimated value) of a single asset, the threshold dictates when a hot or cold wallet should be used based on the aggregate value (e.g., estimated value) of the collection of assets that are or will be associated with the wallet.

In some configurations, a wallet of the wallet system 23350 has a key backup protocol to safeguard keys and to prevent assets from being inaccessible due to lost or mismanaged keys. In some examples, the type of wallet or value of the set of assets associated with the wallet dictates the key backup protocol for the keys associated with the wallet. Some examples of key backup protocols include: (i) storing a copy of the set of keys in a designated private storage location associated with the enterprise 23200 (e.g., backup on enterprise resources); (ii) having an agent or employee store a copy of the set of keys in a hardware device such as a Universal Serial Bus (USB) or hardware wallet; or (iii) storing a copy of the keys with a key service management (KSM) system (e.g., a third-party provider). As an example, a particular protocol may be associated with a backup level. For instance, a first backup level may be associated with the key backup protocol (i) while a second backup level is associated with the key backup protocol (ii). Therefore, when a backup level for a wallet is satisfied, the key backup protocol associated with the backup level is implemented as the key backup protocol for the wallet. For example, the first backup level is that the estimated value of the set of assets associated with the wallet is greater than X but less than Y. Here, when this is true, the key backup protocol of (i) that has been associated with the first backup level is implemented as the key backup protocol for the wallet. In this situation, the key backup protocol for the wallet is that a copy of the set of keys is stored in a designated private storage location associated with the enterprise 23200.

In some implementations, the wallet system 23350 has the ability to manage and/or to generate a plurality of wallets. Having a plurality of wallets may be advantageous to partition or sandbox some digital assets from other digital assets. In other words, the wallet system 23350 may generate multiple wallets that have specific attributes. When a digital asset is received by the wallet system 23350, the wallet system 23350 is configured to determine a set of attributes of the digital asset and to match the determined attributes to one or more of the plurality of wallets. For instance, a wallet may be dedicated to a particular marketplace or business field. Here, in response to receiving a digital asset that includes attributes that correspond to the particular marketplace or business field, the wallet system 23350 associates the digital asset with the wallet that shares or matches those attributes (e.g., exact match or a fuzzy match) and thus associating the digital asset with the wallet that also corresponds to the particular marketplace or business field.

As an example, the wallet system 23350 receives two digital assets that are designated as available digital assets. Upon receiving each digital asset, the wallet system 23350 determines that the first digital asset has a first set of attributes that define the first digital asset as a corporate bond and the second digital asset has a second set of attributes that define the second digital asset as an insurance policy data set. In this example, the wallet system 23350 determines that the first set of attributes matches or shares the most attributes with attributes defined for a financial asset wallet. Based on this determination, the wallet system 23350 associates the corporate bond with the financial asset wallet. In some implementations, to associate the digital asset with a particular wallet, the wallet system 23350 generates an identifier such as a label or a tag for the digital asset that indicates the wallet that the digital asset has been assigned to. In some examples, by having an associated identifier, digital assets can be stored together regardless of their attributes, but yet also be retrieved or managed based on the identifier.

In some embodiments, a wallet system 23350 may be configured such that a wallet holds another wallet (i.e., a "wallet-of-wallets"), such that in order to access a "child" wallet, an entity must access the "parent" wallet that contains the child. For example, resources managed by a workgroup may be contained in a set of wallets that can be accessed by employees within the workgroup, but only if the manager of the workgroup who controls the parent wallet provides access (such as through a set of keys for the parent wallet). In embodiments, multiple layers of wallets and sub-wallets may be provided in a hierarchy, such as ones containing all assets, all assets of a given type (e.g., financial, cryptocurrency, non-fungible tokens, intellectual property, or the like), assets controlled by a given workgroup, assets related to a particular marketplace or exchange, or the like. A wallet-of-wallets can address the need for multiparty access control within an enterprise, such as where primary control of wallet usage needs to be governed by a supervisor, such as a manager.

In some configurations, the wallet system 23350 also functions as a means for orchestrating digital asset transactions. To orchestrate a digital asset transaction, the wallet system 23350 may be configured to integrate and/or to manage payment processes that are associated with a digital asset transaction. For example, as more enterprises become global or multi-regional market participants (e.g., a multi-regional merchant), it is quite likely that these enterprises need to process localized payments from an exchanging party (e.g., from a client or a customer). For reasons such as this, the enterprise 23200 can integrate with multiple region-specific payment service providers (PSPs) via the orchestration functionality of the wallet system 23350. In embodiments, the orchestration functionality may be used to orchestrate currency acquisitions and sales for a wallet, such as by automatically purchasing or selling a given currency based on an enterprise forecast of the amount of the currency that will be needed to achieve enterprise workflows or processes that will involve the currency. The forecast of currency needs, which may be continuously updated, may be based on a model of anticipated transaction workflows that are predicted based on historical transactions, current conditions (including market prices of items to be bought or sold using a currency), and enterprise plans (e.g., a transaction plan). Automated purchasing and sales may maintain an appropriate balance in the wallet of each currency anticipated to be needed across a set of marketplaces or exchanges. Automation may be enabled by a model or other artificial intelligence, such as using any of the learning and intelligence types described herein or in the documents incorporated herein by reference.

To facilitate a digital asset transaction, there may be several types of payment processes that need to be executed. For example, in some digital asset transactions the payment processes may include payment authorization, transaction routing, and transaction settlement. In some examples, in order to orchestrate these digital asset transactions, the wallet system 23350 is configured to electronically connect entities involved in these payment processes, such as PSPs, acquirers, and/or banks and to communicate the appropriate information to these entities to facilitate/execute a transaction.

In some implementations, the orchestration of the wallet system 23350 functions to optimize a digital asset transaction. For example, the transaction optimization functions to determine a best payment route to conduct (e.g., send) a digital transaction. This best route may also be referred to as a best or an optimal transaction rail. Here, the best route may depend on the type of digital asset (such as by selecting a transaction route or rail that is compatible with the asset), the volume or size of the digital transaction (such as by selecting a transaction rail that is capable of handling the volume, one that provides a volume-based benefit, such as a discount, credit, or reward, or the like), the format of the digital transaction, the location of the transaction (e.g., the destination of the transaction and/or source of the transaction), the financing of the digital transaction, the cost of the digital transaction (including transaction cost, borrowing cost, processing costs, costs of energy, and the like) and/or the currency involved in the transaction, among others. As an example, an acquirer of a digital asset (e.g., a market participant 23110) may indicate that they desire a particular digital asset that is available in a wallet of the wallet system 23350. In that case, the acquirer may select a digital asset listed or somehow indicated as available to the interested acquirer. Here, the selection may be coordinated by a transaction facilitator (e.g., an e-commerce interface) that facilitates the transaction for the identified digital asset.

In some implementations, in addition to the selection of the digital asset, the acquirer includes or selects details about the transaction for the digital asset. To illustrate, an exchanging party (e.g., one of the buyers 23112, one of the sellers 23114, or the enterprise 23200) may dictate their preferred payment method (e.g., selected from a list of payment methods that the merchant accepts) using the transaction facilitator. In some implementations, the details about the transaction include terms for the transaction, such as transfer terms (e.g., shipping terms), payment terms (e.g., net 30/60/90), interest terms, licensing terms, or other contract terms (e.g., representations and/or warranties). With the transaction details, the wallet system 23350 may be configured to orchestrate the transaction using a payment or transaction gateway. In some configurations, the wallet system 23350 or another system (e.g., a third-party payment system) encrypts/decrypts some portion of the transaction details (e.g., payment information such as card numbers, routing numbers, communication addresses, etc.) prior to or during communication of the transaction detail to a PSP.

In some configurations, the wallet system 23305 configures the transaction details in order to orchestrate a transaction for an enterprise digital asset. When configuring the transaction details, the wallet system 23350 may specify transaction details that represent the interest of the enterprise 23200. In some situations, to represent the interest of the enterprise 23200, the wallet system 23350 generates transactions details by use of one or more models of the intelligence system 23330. For instance, a model of the intelligence system 23330 may be trained using historical enterprise transaction data to generate a recommendation or prediction of transaction details the enterprise 23200 would prefer for a particular enterprise digital asset, which may be further based on current enterprise conditions (including enterprise resource plans, transaction plans, strategic plans, policies, and the like), market conditions, and other contextual information. A recommendation or prediction may be further used to configure a set of instructions to initiate the transaction, which may be automatically initiated or triggered by an authorized entity. To illustrate, for a particular asset, the wallet system 23350 determines a payment method or payment rail for a transaction involving the particular asset. Some examples of payment methods include clearing houses (e.g., Automated Clearing House (ACH)), credit card providers (e.g., MASTERCARD®, VISA®), online payment systems (e.g., PayPal®), Real-time Payment (RTP) Network, blockchains, the Society of Worldwide Interbank Financial Telecommunications (SWIFT), and Single Euro Payments Area (SEPA). The wallet system 23350 may automatically determine which payment method to use based on characteristics regarding the asset (e.g., asset attributes), the parties involved in the transaction, the location of the transaction, and/or the currency of the transaction.

In some implementations, the wallet system 23350 (and/or other EAL systems) may be configured with an awareness for transactions across sets of assets. For example, in some embodiments, the wallet system 23350 may be configured to identify transactions which would be more efficient to combine or divide. For instance, the wallet system 23350 can determine that instead of selling a first asset in a first marketplace and a second asset in a second marketplace, the enterprise 23200 would receive the most value for these assets by bundling the first and second asset together with a third asset and selling these three assets as a package in one of the marketplaces or a third marketplace. Similarly, the wallet system 23350 may combine acquisitions by packaging multiple acquisitions for different enterprise entities or workflows into a bundle, such as to access volume discounts or other rewards. In other cases, unbundling purchases or sales may provide benefits, such as where discounts are offered for new or trial users of a set of marketplaces or exchanges up to a maximum threshold of transaction value. In other words, with the wallet system 23350 being able to track multiple available assets (including ones desired to be acquired) for the enterprise 23200, the wallet system 23350 can likewise leverage combination or disaggregation of assets to engage in complex transactions that benefit the enterprise 23200 more than unmanaged transactions with the assets. As another example, the wallet system 23350 can operate with supply-side knowledge for the enterprise 23200 (e.g., the supply rate for enterprise digital assets) while also tracking current and past demand-side knowledge across multiple marketplaces for assets that have characteristics, properties, or attributes similar to enterprise assets used in historical workflows in order to generate a recommendation, prediction or instruction about further acquisition. This may further include adjusting the recommendation, prediction or instruction based on an enterprise plan, contextual conditions, or the like.

Another transaction detail that the wallet system 23350 is capable of determining is payment details. Here, one type of payment detail that the wallet system 23350 may coordinate or control is the type of currency that is exchanged and/or when the exchange involving an enterprise digital asset occurs using a particular currency. Determining the type of currency or the timing of a transaction with a particular currency may allow the wallet system 23350 to have another approach to optimize value for a transaction. For instance, the value of different types of currencies is capable of fluctuating based on market conditions. That is, conversion rates or exchanges rates may be determined by a floating rate that depends on market forces of supply and demand for foreign exchange or a fixed rate. Due to the fluctuation of conversion rates, the timing of when a transaction occurs can dictate the buying power or selling power of an asset. To illustrate, if the United States Dollar (USD) has an exchange rate greater than one with respect to the British Pound, then the USD, at that time has greater buying power than when the USD has an exchange rate less than one with respect to the United Kingdom Pound. In other words, with a ratio over one, the USD gets a greater return in British Pound than with a ratio less than one. Therefore, if a transaction for a US enterprise 23200 was going to occur in British Pounds (e.g., with a British market participant), the wallet system 23350 may track the conversation rates and/or facilitate the execution of the transaction at a time within a particular transaction window (i.e., a permitted time period to execute the transaction) that is most advantageous to the US enterprise (e.g., when the USD has the greatest buying power). To facilitate such activity, the EAL system may access a set of predictions of currency conversion rates, such as one generated based on market factors, such as economic data for respective jurisdictions, central bank interest rates, and the like.

Additionally or alternatively, the wallet system 23350 may be capable of identifying a marketplace 23122 or a market participant 23110 operating in a specific marketplace 23122 that enables the conversion rate to be favorable to the enterprise 23200. As an example, the wallet system 23350 may have an enterprise digital asset that is available and demanded by a set of candidate marketplace participants 23110 (e.g., that operate in one or more marketplaces 23122). For each candidate marketplace participant 23110 in the set, the wallet system 23350 determines the preferred currency that would be exchanged with that marketplace participant 23110 for the asset and the conversion rate with respect to a particular base currency (e.g., the default or standard currency for the enterprise 23200). Here, the standard currency for the enterprise 23200 generally refers to the currency that the enterprise 23200 typically holds or predominantly uses. For instance, a US company tends to have a standard currency of USD. In response to the determination of the preferred exchange currency and its associated conversion rate, the wallet system 23350 selects the candidate market participant 23110 with the most favorable conversion rate as the marketplace participant 23110 with which to perform the transaction.

In some configurations, with the selected marketplace participant 23110, the wallet system 23350 may then further optimize the transaction by determining an exchange time within a transaction window where the conversion rate is most favorable to the enterprise 23200. In this sense, the wallet system 23350 is not only capable of tuning a transaction to a favorable currency, but also fine tuning the transaction to occur at a time where that currency has a most favorable conversion rate. This therefore may enable a two-stage optimization of the transaction. In other implementations, when the wallet system 23350 identifies a time for the transaction to occur in a particular currency, the wallet system 23350 performs an assurance check to ensure that other currencies have not suddenly become a more valuable transaction currency for the enterprise 23200 due to market fluctuation. If, during the performance of this assurance check, the wallet system 23350 determines that another currency associated with another one of the candidate marketplace participants 23110 has a more valuable conversion rate than the selected candidate marketplace participant 23110, the wallet system 23350 may instead perform the transaction for the asset with the other candidate marketplace participant 23110.

Similar to currency, the wallet system 23350 may perform transactions accounting for other factors, such as environmental factors, market conditions, economic conditions, or weather conditions. For example, if the exchange of a digital asset is associated with a physical good, the wallet system 23350 can coordinate transaction details, such as shipping logistics or the timing of the performance of the transaction, based on influencing factors such as environmental factors, weather factors, and/or political factors. For instance, if the enterprise 23200 is aware that a network is going to be offline for maintenance, the wallet system 23350 can recognize this upcoming event, and adjust transaction details based on the recognition (e.g., schedule the transactions to occur outside the time when the network is offline). Similarly, if a resource or asset needed by the enterprise is subject to consistent seasonal or other periodic variations in price or availability, the wallet system 23350 can coordinate transactions to acquire the resource or asset at a favorable time (such as during an annual promotional event of a supplier). In embodiments, an acquisition or disposition plan of an enterprise, or instructions derived therefrom, may be linked to or integrated with or into the wallet system 23350, such that the wallet system 23350 is configured to optimize, and then execute, a series of transactions that accomplish the plan (acquisition of needed resources and assets and disposition of others) while optimizing timing and other transaction parameters as noted above.

In some examples, the wallet system 23350 links to or is integrated with an e-commerce engine that includes one or more interfaces. These interfaces may refer to software modules that execute on hardware to provide a portal or graphical user interface (GUI) to interact with the wallet system 23350. That is, the GUI may be designed such that the GUI represents the wallets of the wallet system 23350 and the functionality that is accessible to a particular entity interacting with the EAL 23300. In some examples, the wallet system 23350 includes an interface for each type of entity that has access to the EAL 23300. In other words, an entity of the enterprise 23200 may use an enterprise interface of the wallet system 23350 to facilitate the functionality of the wallet system 23350 for enterprise-based activities (e.g., submitting an enterprise asset available or facilitating transaction details on behalf of the enterprise 23200 for an asset). Similarly, the wallet system 23350 may have a marketplace participant interface separate from the enterprise interface that functions to facilitate actions in the wallet system 23350 that are available to the marketplace participant 23110. For instance, the marketplace participant interface may include an e-commerce shopping interface to discover what assets are available for transactions, a checkout interface such as a shopping cart as a means to stage a series of assets for purchase, or the like.

In some implementations, instead of having multiple interfaces, the wallet system 23350 uses a single interface that is capable of identifying a user of the interface and configuring, presenting or rendering a GUI that matches the access and/or wallet activity permissions associated with the user. In this sense, the single interface is capable of restricting a user from accessing or executing the functionality associated with windows, menus, or other GUI elements that are tied to certain wallet-based activities that should not be accessible to a particular user. For instance, the GUI elements may include an identifier that designates the access permissions required to render the element for display. In this instance, at runtime, wallet system 23350 determines the access permissions associated with a user and renders the GUI elements that satisfy or match the determined access permissions. For example, a purchasing manager in charge of acquiring semiconductor chips may be presented GUI elements that display data from market participants who offer them while not being presented with GUI elements for other goods or services. In this respect, regardless of whether the wallet system 23350 uses one or more interfaces, the user experience (UX) of the interface(s) for the wallet system 23350 differs depending on the entity that is using the interface(s), such that GUI elements and their rendering is tied to access controls and permissions for the wallet system 23350.

Although the wallet interfaces are described with respect to an enterprise entity and a marketplace participant 23110, the wallet interfaces are capable of managing access to the wallet system 23350 (e.g., wallets of the wallet system 23350) at a more granular level such that one enterprise entity may have access to some wallets while another enterprise entity may have access to a different set of wallets (e.g., which may include access to at least one of the same wallets). Similarly, a marketplace participant 23110 (e.g., from a first marketplace 23122) may have access to some wallets (e.g., a first set of wallets) while another marketplace participant 23110 (e.g., a second marketplace 23122 different than the first marketplace 23122) has access to a different set of wallets (e.g., which may include access to at least one of the same wallets). In this manner, the access to the wallet system 23350 can be managed not only at the enterprise/non-enterprise level, but also at the entity level.

As illustrated in FIGS. 231 and 232, the EAL systems of an EAL 23300 may also include a governance system 23360. In some implementations, the governance system 23360 is a means to comply with various rules (e.g., laws, regulations, standards, and/or practices) that impact an enterprise digital asset and transactions regarding the enterprise digital asset. These rules may be government-imposed rules (e.g., laws or regulations), industry-imposed rules (e.g., industry standards or specifications), enterprise-imposed rules (e.g., dictated by an enterprise's code of conduct, mission statement, governance purpose), or consumer-imposed rules (e.g., rules dictated by consumer advocacy groups or consumer watchdogs). For instance, some types of assets may have testing standards that have to be met for the asset to be considered an exchangeable asset. In some examples, the governance is market-specific, such that a specific market has requirements that a market participant needs to satisfy in order to participate in the marketplace. Other types of governance include financial governance, legal or regulatory governance, risk governance, ethical governance and custom governance that may be set by a participating party of a transaction and/or an external entity, such as an operator of a marketplace or exchange, a regulatory body or the like. In order to enforce, monitor, and/or track the governance for an enterprise asset, the governance system 23360 may include any number of libraries that include relevant polices, compliance rules or the like for resources, assets or activities of the enterprise 23200. In embodiments, the libraries may include parameters that define or otherwise correspond to certain rules and/or scenarios.

In some configurations, when an enterprise digital asset is made available in the wallet system 23350, the governance system 23360 identifies any governance that is applicable to the asset. Any identified governances may be indicated in information associated with the asset. In some situations, the governance system 23360, besides merely identifying applicable governance, is configured to determine whether the asset complies with the identified governance. Here, for example, if the asset complies with the identified governance, the asset is made fully available to outside marketplace participants 23110 (e.g., via marketplaces 23122). On the other hand, in some implementations, if the asset fails to comply with the identified governance, the asset may be removed from transactional availability.

In some instances, an asset that fails to comply with governance parameters may be offered at some reduction of value that is proportional to the severity of the compliance failure. In some of these instances, an asset that fails comply with governances may be flagged and include information that identifies the failure such that any such failure is conspicuous to a potential customer or investor in the asset. Here, this allows the asset to stay available, but the risk to be borne by the customer or purchaser is displayed in a transparent fashion. In these instances, the governance system 23360 may generate fault-identifying information that includes a disclaimer or the prominent inclusion of contract terms for the transaction.

FIGS. 231 and 232 also illustrate that the EAL 23300 may include a permissions system 23370. In embodiments, a permissions system 23370 may function as a system for the EAL 23300 that assigns, manages, and/or facilitates access controls and permissions for the EAL 23300. In this sense, the permissions system 23370 is capable of performing access control activities for the other EAL systems associated with the EAL 23300. In other words, the permissions system 23370 can be configured to field permission-based or access requests received by any EAL system. For instance, in response to receiving a request to access the wallet system 23350 via a wallet interface, the permissions system 23370 can be informed of the request and determine a set of permissions associated with the requesting entity. Here, once the permissions system 23370 identifies the set of permissions or access controls associated with the requesting entity, the permissions system 23370 may communicate these permissions to the wallet system 23350 to enable the wallet system 23350 to render the appropriate wallet interface for the requesting user.

The permissions system 23370 may be configured to assign one or more permissions to a user of the EAL 23300. A permission generally refers to a rule that defines access to various portions (e.g., functions) of the EAL 23300. Permissions dictate access parameters in order to control who or what is authorized to access resources. Therefore, permissions are traditionally used to secure resources by permitting who, what, when, or how a resource can be utilized. In some examples, the permissions system 23370 uses access controls or access control lists (ACLs) to manage permissions that are associated with various users of the EAL 23300. These access controls may be discretionary access controls (e.g., managed by business stakeholders of the enterprise 23200), mandatory access controls (e.g., access controls that are deployed to comply with required security protocols for a resource), or role-based access controls (e.g., access controls that correspond to a user's role in the EAL 23300).

As shown in FIG. 232, in some examples, the permissions system 23370 is capable of managing (e.g., assigning, modifying, removing) permissions that are privacy-based rules. That is, an enterprise asset managed by the EAL 23300 may pose privacy concerns. For instance, the enterprise asset (e.g., a medical record) may include personal/protected health information (PHI) which dictates who and/or how a user of the EAL 23300 may interact with that asset. To illustrate, an enterprise entity submits an enterprise asset that includes PHI to the wallet system 23350. Here, the entity may include an indication that the asset includes private or sensitive information or the EAL 23300 (e.g., via the wallet system 23350) determines that one or more attributes for the asset indicate that the asset pertains to private or sensitive information. Based on this determination and/or the precise attribute identified, the permissions system 23370 applies one or more permissions that correspond to a privacy rule implicated by the determination or attribute.

In some implementations, a privacy rule may dictate not only what types of users should access an asset, but also if further processing by the EAL 23300 should occur prior to making the asset available for a marketplace participant 23110 (e.g., in a wallet of the wallet system 23350). For instance, certain assets that include sensitive information may trigger a permission that requires the asset or information included with an asset to be encrypted (e.g., prior to availability of that asset). In this instance, the permissions system 23370 determines that the implicated permission for the asset indicates that the asset (or a portion thereof) should be encrypted. In some configurations, the permissions system 23370 generates an encryption request for the data services system 23320 to enable the data services system 23320 to perform its encryption capabilities. The request may include the asset to be encrypted and the type of encryption being requested for the asset.

Besides implicating privacy rules, the permissions system 23370 can also determine that one or more attributes of the asset or characteristics associated with an entity providing the enterprise asset dictate a particular set of permissions. In some implementations, the characteristics or properties (e.g., entity identifiers) associated with an entity inform the permissions system 23370 which set of permissions should be associated with an asset for which the entity is/was responsible. For instance, when an enterprise entity responsible for an asset seeks to make that asset available via the wallet system 23350, the permissions system 23370 may generate a set of permissions for the asset that correspond to characteristics of the enterprise entity. To illustrate, an enterprise entity may have certain access controls with the enterprise (e.g., a particular level of clearance such as security clearance or confidentiality clearance). The permissions system 23370 may identify that the entity is associated with these access controls and generates permissions for the asset at the EAL 23300 that are similar to or match the access controls associated with the entity at the enterprise. For example, each employee of the enterprise may have an employee identifier. The permissions system 23370 may be configured with a reference table that includes the permissions associated with that employee identifier. Using the table, the permissions system 23370 generates a set of permissions for an asset based on the permissions associated with the employee identifier of an employee who submitted the asset to the EAL 23300. In some configurations, there may be another portion of that table or another table that designates which EAL-based permissions correspond to which enterprise permissions such that the EAL-based permissions can mirror or function in a manner similar to the enterprise permissions. As noted above, permissions may be associated with a set of roles that are managed by an identity management system or platform, such that upon a change of role of an employee, the permissions change (such as removing permissions for a departing employee and applying the previous permissions of an employee to the new employee that is taking the same role).

In embodiments, the permissions system 23370 may further be configured as an approval system for an asset transaction; for instance, the permissions system 23370 may receive an asset transaction request (i.e., a request for a transaction involving the asset) and determine whether the requesting entity has the authorization or approval to proceed with and/or execute the transaction of the asset transaction request. To determine whether the requesting entity has the authorization to perform the transaction, the permissions system 23370 may perform some level of diligence on the details of the transaction. This diligence may include: determining whether the requesting entity has authorization to perform the transaction with the underlying asset(s), determining whether the underlying asset has any conflicts that would inhibit the performance of the transaction, determining whether the transaction is in compliance with one or more plans or policies, or the like.

To determine whether the requesting entity has authorization to perform the transaction, the permissions system 23370 may examine whether the requested transaction satisfies transactional terms for the asset. For instance, some assets or transactions may have transaction detail requirements, such as particular contract terms, minimum pricing, delivery conditions, or timing constraints. When an asset transaction request implicates an asset or transaction that has transaction detail requirements, the permissions system 23370 may identify these requirements and determine whether the requirements are satisfied (e.g., whether minimum thresholds are reached, whether limits are exceeded, or the like). In response to the permissions system 23370 determining that requirements are satisfied, the permissions system 23370 may communicate its approval of the transaction (e.g., to the wallet system 23350). On the other hand, in response to the permissions system 23370 determining that the requirements are not satisfied, the permissions system 23370 communicates that the EAL 23300 should decline the transaction (e.g., to the wallet system 23350). In embodiments, the permissions system 23370 may determine a modification of an otherwise non-compliant transaction that would render it compliant and may communicate the modification, such that the EAL 23300 may execute a modified transaction, such as by purchasing a reduced amount of an item or discovering an alternative source of an item that has a lower price to keep a transaction below a transaction spending threshold, modifying a time of execution to satisfy a waiting period, obtaining an additional approval to satisfy permissioning requirements, purchasing offsets or credits to allow a transaction to satisfy a sustainability objective, or the like.

In embodiments, the permissions system 23370 may also be configured to determine whether the underlying asset has any conflicts that would inhibit the performance of the transaction. This may be important because a large enterprise may have a large portfolio of assets. With a large number of available assets, it is possible that one asset transaction request involves the same underlying asset as another transaction request; for example, both assets may be made subject to requests that they be used as collateral for two different loans, where each loan transaction requires a senior claim to the asset in the case of default. As another example, two transactions may require sale of the same asset to two different counterparties. Due to the possibility of such conflicts, the permissions system 23370, upon receiving the asset transaction request, can determine what transactions are pending or have been requested. From the set of transactions that are pending or have been requested, the permissions system 23370 determines whether any transactions of the set have been authorized for the asset specified by the asset transaction request. If a transaction of the set has been authorized for the asset specified by the asset transaction request, the permissions system 23370 may be configured to deny the asset transaction request (e.g., without disclosing the further details regarding the conflict). In some examples, when an asset transaction request is denied, the permissions system 23370 may recommend a similar alternative asset or set of assets as a substitution for the asset. Similarity may be determined by asset type, asset value, or the like. In embodiments, the EAL 23300 may access capabilities of the transaction platform described elsewhere herein or in the documents incorporated herein by reference for automatically determining similarity of assets based on their attributes and for automatically determining an alternative or substitute asset set based on such similarity, such as to recommend or instruct a set of assets to be provided as substitute collateral for a lending transaction and/or as substitute items for a purchase or sale.

In embodiments, the EAL systems of an EAL 23300 may include a reporting system 23380. Generally speaking, the reporting system 23380 functions to provide some level of reporting to or from the EAL 23300, other EAL systems, non-EAL systems, and/or specified entities of an enterprise. For instance, the reporting system 23380 is capable of providing compliance report(s) for one or more assets of the EAL 23300. Here, the type of compliance report that the reporting system 23380 generates may depend on the type of asset to be reported. For instance, a financial asset and a transaction regarding a financial asset may have compliance reporting requirements for accounting or tax purposes. In that regard, the reporting system 23380 generates a compliance report that fulfills the accounting/tax requirements.

Similarly, the reporting system 23380 may be customized to provide different types of reports. For instance, the reporting system 23380 may be configured to generate a fraud report that conveys transactions that were not authorized or that triggered a fraud alert to occur at the EAL 23300. Here, a fraud alert may come from a third party (e.g. PSP) or from another EAL system (e.g., the permissions system 23370). The reporting system 23380 may also be configured to generate financial reports for financial activity at the EAL 23300. Here, the reporting system may compile financial information regarding transactions that have been executed over some designated or customizable period of time. In some implementations, transactions at the EAL 23300 may have legal implications, such as legal or regulatory reporting obligations. In these implementations, the reporting system 23380 may be configured to generate a legal or regulatory report that is setup to identify transactions that implicate a legal condition and to include these identified transactions in the legal report that the reporting system 23380 generates.

In addition to reports like compliance reports, financial reports, and legal or regulatory reports, the reporting system 23380 may also be configured to generate statistical reports that include statistics or metrics regarding the assets managed by the EAL 23300 and/or activity (e.g., transaction activity) of the EAL 23300. Statistical reports may be their own standalone reports or may be integrated into other types of reports generated by the reporting system 23380 (e.g., part of a financial report). Similarly, the reporting system 23380 may generate EAL activity reports that set forth instances of a particular activity or set of activities that are performed at the EAL 23300. For instance, among many other statistics and metrics, an EAL report may include how many times a particular asset or type of asset is queried, how many times an asset or type is included in a transaction request, what assets or types are available in which wallets of the wallet system 23350, volumes of asset transactions (purchases, sales, exchanges, loans), prices of asset transactions, characteristics of parties involved, and many others.

FIGS. 233 and 234 depict different examples of how an EAL 23300 may be implemented. For example, as shown in FIG. 233, instead of being integrated with the enterprise 23200 (e.g., akin to FIG. 232), the EAL 23300 may be integrated with different systems on the market side 23104 of the enterprise ecosystem. To illustrate, FIG. 233 shows a set of EALs 23300*a-n* that are integrated with a set of marketplaces 23122*a-n*. When integrated with a particular marketplace 23122, some or all computing resources relied upon for the EAL 23300 may be hosted on the computing resources associated with the marketplace 23122 (e.g., marketplace servers). Alternatively, when an EAL 23300 is integrated into a particular marketplace 23122 there may be portions of the EAL 23300 that remain hosted by enterprise resources to ensure aspects of security and/or privacy for enterprise assets. Referring specifically to FIG. 233, a first EAL 23300*a* is associated with or integrated with an orchestrated finance marketplace 23122*a*. A second EAL 23300*b* is integrated with an orchestrated insurance marketplace 23122*b*. A third EAL 23300*c* is integrated with an orchestrated lending marketplace 23122*c*. A fourth EAL 23300*d* is integrated with the third-party systems 23124*a*. An nth EAL 23300*n* is integrated with an nth orchestrated marketplace 23122*n* since other types of marketplaces (not shown) can similarly integrate the functionality of the EAL 23300.

In some implementations, the functionality of the EAL 23300 is distributed across market-side systems such that portions of the EAL 23300 that interface with a particular marketplace 23122 are integrated with that marketplace 23122 while other portions of the EAL 23300 that interface with another marketplace 23122 are integrated with the other marketplace 23122. An example of this would be that the financial offerings of the EAL 23300 are integrated with the finance marketplace 23122*a* as the first EAL 23300*a* while insurance offerings of the EAL 23300 are integrated with the insurance marketplace 23122*b* as the second EAL 23300*b*. In some configurations, the distribution of the EAL 23300 may be such that wallets of the wallet system 23350 are integrated amongst the marketplaces to which they relate. For instance, a wallet that includes financial enterprise assets is integrated with the finance marketplace 23122*a* and is represented by the first EAL 23300*a*. On the other hand, a wallet that includes insurance-related enterprise assets (e.g., data sets that may be integrated with insurance policies or contracts) is integrated with the insurance marketplace 23122*b* and is represented by the second EAL 23100*b*.

FIG. 233 also illustrates another scenario on the right side of the figure where an EAL 23300*n*+1 can be a stand-alone system (e.g., a microservice that enterprises leverage). In other words, the stand-alone system is capable of communicating with both the enterprise 23200 and the market-side systems such as the storage system 23126, third-party systems 23124*b*, and the orchestrated marketplace 23122*n*+1. As a stand-alone system, the EAL 23300*n*+1 may be configured such that the resources (e.g., computing resources) that the EAL 23300*n*+1 relies upon for operation are not hosted by, for example, the enterprise 23200 or the orchestrated marketplace 23122*n*+1. This may ensure that computing resources that the EAL 23300 may require are not occupied or being consumed by other resources at its host to compromise or somehow hinder the performance of the EAL 23300. That is, if the EAL 23300 shares resources with a system, that sharing may require priority procedures when resources are occupied or time in queue to wait for a particular resource to be available for utilization.

FIG. 234 is an example of the EAL 23300 integrated with the configured market orchestration system 23400 (e.g., similar to a portion of FIG. 233). The configured market orchestration system 23400 may refer to a system that can control and/or manage a market ecosystem. In some respects, the configured market orchestration system 23400 may be considered a "system of systems" because it is a structure that provides cooperative coordination among a set of market-related systems that are configurable for the execution of various market services/tasks. In some examples, the configured market orchestration system 23400 is a system that can function as a liaison for a set of systems or services. For instance, as shown by FIG. 232, the configured market orchestration system 23400 generally includes a configured intelligence service 23410 and configured system services 23420. The configured market orchestration system 23400 may also manage a set of transactional systems 23430. As shown in FIG. 232 some examples of these transactional systems 23430 include an asset valuation system, a collateralization system, a tokenization market system, a market orchestration system, a market making system, and a market governance and trust system. Some of these systems may be variations of the EAL system described previously. For instance, the market governance and trust system may be functionally similar to a combination of the governance system 23360 and the permissions system 23370 of an example EAL 23300. In embodiments, the transactional systems 23430 may be configured for the purpose of generating and/or controlling particular aspects of a market (i.e., transactional execution) while EAL systems may be configured for accessing markets and performing transactions on behalf of an enterprise.

In order to manage the set of transactional systems 23430, the configured market orchestration system 23400 leverages the functionality of the configured intelligence service 23410 and the configured system services 23420. The configured intelligence service 23410 is a framework for providing intelligence services to one or more services, such as the configured system services 23420. In some implementations, the configured intelligence service 23410 receives an intelligence request to perform a specific intelligence task (e.g., a decision, a recommendation, a report, an instruction, a classification, a pattern or object recognition, a prediction, an optimization, a training action, a natural language processing request, etc.). In response, the configured intelligence service 23410 executes the requested intelligence task and returns a response to the intelligence service requestor (e.g., the configured system services 23420).

The configured intelligence service 23410 may include an intelligence service controller 23412 and a set of artificial intelligence (AI) modules 23414. When the configured intelligence service 23410 receives an intelligence request (e.g., from a transactional system 23430 or from the configured system services 23420), the request may include any specific/required data to process the request. In response to the request and the specific data, one or more implicated AI modules 23414 perform the intelligence task and output an "intelligence response." Examples of responses from AI modules 23414 may include a decision (e.g., a control instruction, a proposed action, machine-generated text, and/or the like), a prediction (e.g., a predicted meaning of a text snippet, a predicted outcome associated with a proposed action, a predicted fault condition, an anticipated state of an entity or workflow relevant to a transaction (such as a future price, interest rate, or conversion rate), and/or the like), a classification (e.g., a classification of an object in an image, a classification of a spoken utterance, a classified fault condition based on sensor data, and/or the like), a recommendation (e.g., a recommendation for an action to optimize a transaction parameter), and/or other suitable outputs of an artificial intelligence system.

There may be a variety of AI modules 23414 associated with the configured intelligence service 23410 to have the broad capability to output the many types of intelligence responses that may be requested of the configured intelligence service 23410. Some examples of these AI modules 23414 include ML modules, rules-based modules, expert system modules, analytics modules (e.g., econometric models, behavioral analytics, collaborative filtering, entity similarity and clustering, and others), automation modules, control system modules, robotic process automation (RPA) modules, digital twin modules, machine vision modules, NLP modules, text-to-speech modules, and neural network modules, as well as any other types of artificial intelligence systems described herein or in the documents incorporated herein by reference and encompassing hybrids or combinations thereof (e.g., where an AI modules uses more than one type of neural network). It is appreciated that the foregoing are non-limiting examples of AI modules 23414, and that some of the modules may be included or leveraged by other AI modules.

As shown in FIG. 234, the AI modules 23414 interface with the intelligence service controller 23412, which is configured to determine a type of request issued to the configured intelligence service 23410 (e.g., from an intelligence requestor such as the configured system services 23420 or a transactional system 23430) and, in response, may determine a set of governance standards and/or analyses that are to be applied by or to the AI modules 23414 when responding to the request. In some examples, the intelligence service controller 23412 may include an analysis management module, a set of analysis modules (e.g., shown as a fraud detection module, a risk analysis module, and a forecasting module), and a governance library.

In some implementations, the analysis management module receives a request from the AI modules 23414 and determines the governance standards and/or analyses implicated by the request. In some examples, the analysis management module may determine the governance standards that apply to the request based on the type of decision that was requested and/or whether certain analyses are to be performed with respect to the requested decision. For example, a request for a control decision that results in the configured system services 23420 configuring an action for the transactional system 23430 may implicate a certain set of governance standards that apply, such as safety standards, legal or regulatory standards (e.g., privacy standards, "know your customer" standards, reporting standards, export control standards and many others), financial accounting regulatory standards, legal standards, quality standards, or the like, and/or may implicate one or more analyses regarding the control decision, such as a risk analysis, a safety analysis, an engineering analysis, or the like. In embodiments, the governance standards may apply to the AI modules; for example, a training data set used for an AI module may be required to be satisfy governance standards, such as representativeness of data, absence of bias, adequacy of statistical significance, absence of inequity in resulting outcomes, and the like. As one such example, a training data set of historical transactions used to train an AI module to identify a favorable counterparty may be governed by policy that requires that the training data set include historical transactions that are free of racial, ethnic, or socioeconomic imbalances, compliance analysis, an engineering analysis, or the like.

In some instances, the analysis management module may determine the governance standards that apply to a decision request based on one or more conditions. Non-limiting examples of such conditions may include the type of decision that is requested, a location (e.g., geolocation, jurisdiction, data processing location, network location, or the like) in which a decision is being made, a location in which an activity governed by the decision will be executed (e.g., where an asset or resource will be purchased, stored, sold, or the like), an environment or system that the decision will affect, current or predicted conditions of the environment or system, a set of parties to a transaction affected by the decision, and/or the like. The governance standards may be defined as a set of standards, policies, rules, or the like in a governance library, which may include a set of standards libraries. The foregoing may define conditions, thresholds, rules, recommendations, or other suitable parameters by which a decision may be analyzed. Examples of may include, legal standards library, a regulatory standards library, a quality standards library, a financial standards library, a risk management standards library, an environmental standards library, a sustainability standards library, an ethical standards library, a social standards library, and/or other suitable types of standards libraries. In some configurations, the governance library includes an index that indexes certain standards defined in the respective standards library based on different conditions or context. Examples of conditions may be a jurisdiction or geographic area to which certain standards apply, environmental conditions to which certain standards apply, device types to which certain standards apply, materials or products to which certain standards apply, and/or the like.

In some implementations, the analysis management module may determine the appropriate set of standards that must be applied with respect to a particular decision and may provide the appropriate set of standards to the artificial intelligence modules 23414, such that the AI modules 23414 leverage the implicated governance standards when determining a decision. In these embodiments, the AI modules 23414 may be configured to apply the standards in the decision-making process, such that a decision output by the AI modules 23414 is consistent with the implicated governance standards. It is appreciated that the standards libraries in the governance library may be defined by the platform provider, customers, and/or third parties. The standards may be created, managed, promulgated and/or overseen by various sources, such as government standards, industry standards, customer standards, enterprise standards, non-governmental entity standards (e.g., international agencies), or standards from other suitable sources. Each set of standards may include a set of conditions that implicate the respective set of standards, such that the conditions may be used to determine which standards to apply given a situation. In embodiments, the standards may be embodied in executable logic, such that elements of standards are automatically applied, optionally at the level of an individual workload or service within a workflow or system, such as by prompting workload developers to embed standards compliance (and any other policies) into the workload development and deployment process.

In some embodiments, the analysis management module may determine one or more analyses that are to be performed with respect to a particular decision and may provide corresponding analysis modules that perform those analyses to the AI modules 23414, such that the AI modules 23414 leverage the corresponding analysis modules to analyze a decision before outputting the decision to the requestor. In some examples, the analysis modules may include modules that are configured to perform specific analyses with respect to certain types of decisions, whereby the respective modules are executed by a processing system that hosts the instance of the configured intelligence service 23410. Non-limiting examples of analysis modules may include one or more risk analysis modules, econometric analysis modules, financial analysis modules, behavioral analysis modules (e.g., of user behavior, system behavior, or the like), security analysis modules, decision tree analysis modules, ethics analysis modules, forecasting analysis modules, quality analysis modules, safety analysis modules, regulatory analysis modules, legal analysis modules, and/or other suitable analysis modules, including any of the analysis types described herein or in the documents incorporated herein by reference.

In some configurations, the analysis management module is configured to determine which types of analyses to perform based on the type of decision that was requested to be performed by the configured intelligence service 23410. In some of these configurations, the analysis management module may include an index or other suitable mechanism that identifies a set of analysis modules based on a requested decision type. Here, the analysis management module may receive the decision type and may determine a set of analysis modules that are to be executed based on the decision type. Additionally, or alternatively, one or more governance standards may define when a particular analysis is to be performed. For example, the regulatory standards may define what scenarios necessitate a risk analysis. In this example, the regulatory standards may have been implicated by a request for a particular type of decision and the regulatory standards may define scenarios when a risk analysis is to be performed. In this example, AI modules 23414 may execute a risk analysis module and may determine an alternative decision if the action would violate a respective legal standard. In response to analyzing a proposed decision, AI modules 23414 may selectively output the proposed condition based on the results of the executed analyses. If a decision is allowed, AI modules 23414 may output the decision to the requestor. If the proposed configuration is flagged by one or more of the analyses, AI modules 23414 may determine an alternative decision and execute the analyses with respect to the alternate proposed decision until a conforming decision is obtained.

In embodiments, the configured system services 23420 function to configure a set of systems (e.g., the set of transactional systems 23430) corresponding to the configured market orchestration system 23400 to perform a set of services based on intelligence determined for the configured system services 23420. Like configured intelligence services 23410, configured system services 23420 provide data storage, library management, data handling, and/or data processing services that are tailored to requirements associated with a particular market orchestration system 23400 (e.g., in response to data requests and/or directed market transactions by the EAL 23300). In some examples, the configured system services 23420 uses the configured intelligence service 23410 to generate decisions relating to configurations of the set of transactional systems 23430. For instance, if the configured system service 23420 is to configure a smart contract as the configured transactional system, the configured system services 23420 leverages the intelligence of the configured intelligence service 23410 to formulate an intelligence request that will configure some portion of a smart contract (e.g., determine one or more parameter values corresponding to conditions defined in the smart contract).

In some implementations, the systems services that are configured to become the configured system services 23420 are the EAL systems of the EAL 23300. In other words, the configured system services 23420 uses intelligence generated by the configured intelligence services to configure aspects of the EAL 23300, such as the wallet system 23350 or the permissions system 23370. In some implementations, the configured system services 23420 not only configure input or control parameters of EAL systems that perform (e.g., the wallet system 23350) or evaluate transactions (e.g., the permissions system 23370), but also configure input or control parameters that impact the user experience or user interface of the EAL 23300 (e.g., configuration parameters associated with the interface system 23310). Here, since EAL systems may be associated with the configured system services 23420, an EAL system may function via the configured system services 23420 as a requestor for a particular intelligence response.

In some configurations, such as FIG. 234, the configured system services 23420 is capable of performing general system services. These general system services may include operations such as data storage, data processing, networking, etc. that are configured for a particular function or set of functions. As shown in FIG. 234, these general system services may be integrated or controlled by the configured system services 23420. However, in some configurations, it may be more advantageous for the general system services to be more widely available to aspects of the configured market orchestration system 23400. Therefore, the general system services may be its own entity that is accessible to both the configured intelligence service 23410 and the configured system services 23420, but not tethered specifically to the functionality or computing resources of either service.

In some configurations, a configured market orchestration system 23400 is configured for a particular marketplace 23122. As an example, the configured market orchestration system 23400 is configured for a lending marketplace. For instance, the integrated enterprise access layer **23300*c* of the orchestrated lending marketplace 23122*c* is a part of a configured market orchestration system 23400 for the orchestrated lending marketplace 23122*c*. In this example, the configured market orchestration system 23400 via the transactional systems 23430 may perform tasks that may require external information (e.g., current market data) for functions, such as asset valuations, inventory access, business profile management, market analysis, and the like. Depending on the task, subsequent tasks or analyses may be handled (e.g., directly handled) by the configured market orchestration system 23400, by the EAL 23300**, or some combination of both.

In some implementations for a configured market orchestration system 23400, the workflow system 23340 of the EAL 23300 can manage or assist in managing one or more of the task-based information exchanges, analyses, and/or transactions by assembling workflow components, identifying pre-existing workflows, or developing workflows based on ML and AI methods. Examples of workflow components include: lookup of an asset serial number to determine a date of manufacture, existing service information, verification of ownership, etc. for the task of asset valuation and collateralization; reviewing business credit rating, claims, customer history, collateral to lending ratio, asset liquidity, etc. for the task of risk evaluation; determining minimum requirements for collateral, min/max allowable insurance for certain asset types, specific asset validation/verification requirements, etc. for the task of regulatory compliance; obtaining bid requests and analyses for the task of evaluation of insurance options and recommendations; and determining transaction type based on customer, client, regulation, etc. for the task of negotiation and completion of transactions.

To illustrate by an example, the workflow system 23340 may generate a set of workflow steps that define a task of a business loan request that proposes the use of machine tools as collateral for a loan to expand business. In this example, a first workflow step may be for the configured market orchestration system 23400 to parse loan application information to identify equipment (collateral) types and characteristics. Here, a second workflow step may be that the configured market orchestration system 23400 submits a preconfigured market-specific request to provide information associated with collateral resale value, liquidity, and market depth, including searches of relevant private or public marketplaces. Here, the EAL 23300 may provide a value range to the configured market orchestration system 23400. A third workflow step may be that the configured market orchestration system 23400 submits a preconfigured market-specific require for the EAL 23300 to obtain information associated with the business requesting the loan. In this workflow step, the EAL 23300 may return, for example, credit ratings, outstanding loans, and/or transactions histories. A fourth workflow step may be that the configured market orchestration system 23400 submits a preconfigured market-specific risk analysis request to the EAL 23300 based on government and lender requirements. In some embodiments, this suggested EAL analysis could be automatically selected from a library developed for a type of loan or industry. As an alternative, this fourth workflow step may be completed by the configured market orchestration system 23400 and then verified by the EAL 23300. A fifth workflow step may be based on the internal analyses and/or information provided by the EAL 23300. For instance, in this fifth workflow step, the configured market orchestration system 23400 develops or selects an insurance bid package for submission to market participants. Here, as an example, the configured market orchestration system 23400 may select the best option from among bidders. A sixth workflow step may be that the configured market orchestration system 23400 engages the EAL 23300 to complete the transaction and submit the required documentation. This step may include a series of preconfigured functions selected for bid payment terms and methods, reporting requirements, and the like.

With an EAL configuration, assets of an enterprise 23200 can be natively integrated into marketplaces 23122 without the enterprise 23200 having to necessarily conduct advertising or marketing campaigns. That is, the wallet system 23350 in combination with the interface system 23310 can enable enterprise assets associated with wallet(s) to be readily available to marketplaces 23122. This allows assets of the enterprise 23200 to be market-facing without having to orchestrate product/service offering campaigns. In this respect, the assets can be offered natively on various platforms. Additionally, since the interface system 23310 and/or wallet system 23350 has access to multiple marketplaces, the EAL 23300 can offer assets in marketplaces that are not necessarily the same type of goods/services as the assets, but rather complimentary marketplaces or even marketplaces that are not traditionally offering assets with attributes similar to the available enterprise assets. For instance, an enterprise asset may be a financial asset and yet be offered or integrated into non-financial contexts. To facilitate the market for an asset, in embodiments, a reserve price may be associated with the asset, at which an enterprise is willing to part with the asset if and when it is sought by a market participant in one of the markets in which it can be viewed, such as by the aforementioned via wallet integration.

In some examples, the EAL 23300 allows the securitization and/or tokenization of future revenue streams for the enterprise 23200. Here, an enterprise 23200 can offer assets such as financial history, futures contracts, or other valuable enterprise insights (e.g., as asset-backed tokens) to secure capital or credit in various lending marketplaces. For instance, the enterprise 23200 may request an instant cash advance against the full annual value of the enterprise's subscriptions or source of recurring revenue. This means that the enterprise 23200 can leverage its various assets in traditional or non-traditional lending marketplaces that the EAL 23300 has the capability with which to interface. To illustrate, the EAL 23300 may be configured to translate subscription or recurring payment revenue (e.g., future revenue streams) into instant capital (i.e., cash). For example, the EAL may seek to mitigate risk of a substantive portion of expiring revenue streams and engage the available marketplaces 23122 via the EAL 23300 to access a lender for these future enterprise assets.

In some configurations, to induce or to support lender transactions against future enterprise assets, the lender is able to request other enterprise assets (e.g., proprietary data sets) to form a basis, collateral, escrow, representation, or warranty against the transaction. As one example, the lender may offer a cash advance for future subscription revenue streams of the enterprise 23200 with terms that a new product will launch according to some parameters indicated by enterprise data sets made available to the lender. In situations where the lender executes a transaction based on supporting enterprise data sets, the lender may also receive those enterprise data sets in the transaction, allowing the lender to engage with marketplaces 23122 to sell the enterprise data sets if it so chooses. In this respect, lenders and marketplace participants 23110 transacting with an enterprise can leverage cross market transactions (e.g., as secondary revenue streams to support primary transactions).

In some implementations, when the enterprise 23200 offers its revenue stream as an enterprise asset to secure lending (e.g., an instant cash advance), the result of the lending can be represented digitally by tokenization. In other words, even though the enterprise 23200 has received non-digital currency (e.g., cash), the wallet system 23350 may represent that cash in digital form by means of a token such that the cash can operate as a digital enterprise asset that can participate in digital transactions using the EAL's capabilities. Additionally or alternatively, a smart contract corresponding to the loan/revenue stream may interface with an oracle that receives proof of payment from legacy off-chain systems and that reports verification of the received payment to the smart contract.

By being able to operate in a digital space, the EAL 23300 is able to employ different digital advantages to transactions. For instance, the assets such as operational assets, financial assets, or other assets can utilize tokenization to permit only a particular set of actions by selected stakeholders. The actions permitted by a token can be agreed upon according to consensus mechanisms by a set of stakeholders, or they can be dictated by a governing entity, such as an enterprise manager or executive. In some implementations, because these tokens are functioning to verify agreed upon actions, these tokens may be referred to as "verifiable action tokens."

In some configurations, the tokenization can occur for any enterprise asset. For instance, certain enterprise assets (e.g., enterprise data sets) may include confidential or private information for (i) individuals associated with the enterprise 23200, (ii) clients of the enterprise 23200, or (iii) confidential information or actions of the enterprise 23200, among others. Enterprise assets that include confidential or private information may be encoded or tokenized (e.g., by the data services system 23320) at the EAL 23300. By encoding the asset or some determined portion thereof, the enterprise 23200 can offer assets relating to or including this information without compromising security, confidentiality, or privacy. In some examples, when tokenizing or encoding some or all of an enterprise asset, the reporting system 23380 generates a report or stores a ledger of these encoded events. By generating such as record, the EAL 23300 can allow the enterprise 23200 to prove compliance or back trace its operations in case of an audit or other request of concern.

In some configurations, the EAL 23300 is able to facilitate transactions for market enterprise resources that may not be traditionally considered as exchangeable assets to the enterprise 23200. It is becoming more common in the age of big data that data sets by themselves can be a valuable asset. For instance, with aspects of artificial intelligence becoming more prevalent, its intelligent capabilities often demand data sets that are used for training, such as to allow the AI to learn to perform some type of task or function. As a large organizational structure, the enterprise 23200 can generate vast amount of data sets regarding its workings (e.g., operations, strategy, planning, sales, marketing, finances, human resource management, etc.) that can be valuable in the training of particular types of AI. For instance, an insurance company may be interested in the occupational conditions of workers that it insures, but finding a large, meaningful data set that characterizes occupational conditions may be rather difficult to find, at least publicly. Yet many enterprises 23200 track or have data regarding their own occupational conditions. In this example, the insurance company would find it valuable to have access to data sets characterizing the occupational conditions of at least the enterprise 23200. The EAL may provide access to such data sets, such as by representing them in a wallet or other system that can be accessed by market participants. Use of the data may be governed by governance and permission systems as noted herein; for example, the data may be permitted to be accessed only in a machine-readable form that is accessible to a neural network or other AI system being trained. In embodiments, portions of the data, such as representing private information, may be anonymized, obfuscated, deleted, redacted, or the like to allow data to be used for training AI while not being used for other purposes. In embodiments, a set of governance policies for the data set may be configured such that the policies are automatically applied to any AI system that is trained using the data; for example, in order to access the training data set, the AI system may be required to demonstrate that it is governed by code or logic that validates that the AI system will be governed in the way required by the policies. As one example, the AI system may be permitted to operate only for a limited purpose, a limited time, in a limited location, by a limited type of party, or the like.

The EAL configuration can allow marketplace participants 23110 to request or to form markets to which the enterprise 23200 may have assets to contribute or from which the enterprise 23200 may wish to obtain assets. For example, an insurance company may request data sets regarding occupational conditions, and the EAL 23300 may parse or receive that request and then determine whether it has the assets available to fulfill that request. When the requested asset is not available at the time of the request, the EAL 23300 may be configured to interface with the enterprise 23200 to present the opportunity to the enterprise 23200 and give the enterprise 23200 the opportunity for fulfillment of the request. In other words, the available enterprise assets may not include an occupational conditions dataset, but when the EAL 23300 presents that request to the enterprise 23200, the enterprise 23200 determines that it can supply one or more data sets to fulfill that request and makes the one or more data sets available as enterprise assets via the wallet system 23350.

In some implementations, "data-as-a-transaction" (e.g., data sets as transacted entities) can contribute to context-based accommodations to transactions between parties. As an example, access to data (e.g., an enterprise asset) could be used by a party to gain advantages in pricing with an acceptance of an increase in risk. For instance, an insurer may allow a partial premium payment based on the delivery by the insured (e.g., the enterprise 23200) of specified data types (i.e., specialized enterprise assets). Here, receipt of the specified data types may automatically trigger a smart contract to adjust or generate one or more terms regarding, for example, pricing, interest rates, conversion rates, deductibles, underwriting requirements, ancillary offerings, promotions, term duration, limits on liability, warranties and representations, etc. To illustrate, a factory of an enterprise may have a liability and workman's compensation policy with some amount of designated coverage. As party of the policy, there may be specified data thresholds regarding, for example, the number of employees on the floor per shift, the number of machine hours of operation per day, the types of machines in operation, the number of sick days, injury reports, and insurance status of employees. When the factory has enough data to satisfy (e.g., surpass or exceed) the specified thresholds, the data may be transferred to the insurer and provisions of the policy affected are adjusted based on the data transferred. For example, the factory sends data (i.e., an enterprise asset) that 83% of its employees are insured. Here, since this 83% exceeds an 80% threshold that allows for a reduction in the policy premium, the transfer of data causes the policy premium adjustment for the factory's policy; in embodiments, the premium may be further reduced if the insurer is permitted to use the data (possibly in anonymized, obfuscated, or otherwise modified form) for its own purposes, such as to facilitate more accurate underwriting or for generation of improved actuarial, economic or predictive models (including predictions of the emergence of insurable risks). In some configurations, the EAL transfers (i.e., a transaction of an enterprise asset) or facilitates the transfer of data along with a protocol request (e.g., a request to adjust the premium). The insurer may also leverage enterprise asset transactions to inform their contracts and policies. For instance, the insurer may generate a query for data from the enterprise (e.g., the factory) to ensure or audit that the conditions of the policy are being met. In other words, the insurer may query or request an enterprise asset transaction for data regarding the number of employees on the floor per shift. Here, if the number increased unbeknownst to the insurer, the query may inform the insurer to adjust the premium (e.g., to increase the premium because the factory has moved to a greater risk level based on the query results for the number of employees on the floor per shift).

When enterprise assets are various types of data sets, the enterprise 23200 may have difficulty understanding the value of a particular data set. For instance, if an insurer would like to purchase data sets for working conditions of the enterprise 23200 to facilitate products or services of the insurer (such as to tailor premium offerings to marketplace participant conditions, to improve underwriting, to improve prediction, or the like), the enterprise 23200 may be unable to properly value this enterprise asset due to its unconventional nature or the mere fact that it is not the type of asset with which the enterprise 23200 is used to dealing. In these situations, the EAL 23300 may request or generate an evaluation marketplace, such as by sourcing (optionally by crowdsourcing) a set of target consumers (e.g., would-be data utilizers) to determine the estimated value for the data set. To generate an evaluation marketplace, the EAL 23300 may invite a set of would-be data providers (e.g., providers who could produce the type of data sets requiring valuation) and/or a set of would-be data utilizers (e.g., target consumers that could demand the types of data sets requiring valuation). In some examples, the parties that accept the invitations become virtual auction participants in order to provide a near-real market valuation of the data sets. That is, the participating would-be data provider posts or submits their data set (e.g., having one or more characteristics similar to the enterprise data set) and the participating would-be data utilizer(s) bid (e.g., propose an estimated value that they would pay) on the posted data set. In some configurations, this bidding process continues for each available data set from the pool of participating would-be data providers. In these configurations, the EAL 23300 may use statistical inference with the plurality of bids for the available data sets to generate a valuation for the similar data set owned by the enterprise 23200. In some examples, the virtual auction house actually performs the offering of the enterprise data set during the auction so that the would-be data utilizers are not biased in their bidding. In embodiments, the EAL may, additionally, or alternatively, facilitate a set of simulations to help assess the value of the data, such as simulations that are informed by historical transactions in data sets having some similarity to available data sets, as well as informed by current marketplace conditions (such as offered prices of other data sets). In some examples, the participants in the virtual auction house engage with the virtual auction for evaluation purposes such that a participant does not receive the enterprise data set, but assists in its valuation for a future market offering. When functioning for a future market offering, it may be advantageous to include a large number of participants to statistically overcome potential bidding biases.

In some situations, following the valuation (such as using a virtual auction house, simulation, or other approached noted above), the EAL 23300 enables the enterprise 23200 to further adjust the valuation of the data set. For instance, the EAL 23300 generates a feedback request to the enterprise 23200 to authorize the estimated value assigned to the data set and the enterprise 23200 provides a message in response to the feedback request that either approves the valuation or adjusts the valuation in some manner. Here, this adjustment feedback loop allows the enterprise 23200 to determine if the valuation justifies the offering of the data set or if the enterprise 23200 would prefer to offer the data set at a higher or lower transactional value compared to the valuation. For example, the value of the data set to the owner (i.e., the enterprise) may differ from the value of the data set to the market. Depending on the disconnect or gap between the owner value and the market value, the enterprise 23200 may adjust the transaction value accordingly. Similarly, being informed by the valuation can also enable the enterprise 23200 to opt out of offering the data set.

In some configurations, the EAL 23300 controlled by an enterprise 23200 receives a data set from the enterprise 23200. Here, the data set may characterize one or more attributes associated with a group of resources privately controlled by the enterprise 23200. For instance, the data set may characterize information about a group of employees of the enterprise 23200 (e.g., factory workers) or a group of equipment (e.g., production equipment of the enterprise 23200). Upon receipt of the data set, the permissions system 23370 determines whether the data set satisfies a set of permission criteria. The permission criteria may refer to criteria that indicates a set of privacy rules, access rules, security rules, compliance rules, or other rules applicable to assets, resources or other entities that are controlled by the enterprise 23200. The enterprise 23200 or its agent may configure these rules or generate the rules to correspond to industry/legal standards (e.g., dictated by the governance system 23360), such as of acceptable privacy (e.g., to abide by the Health Insurance Portability and Accountability (HIPA) Act or General Data Protection Regulation (GDRP)), or the like.

Depending on the determination of whether the data set satisfies the set of permission criteria, the permissions system 23370 may perform different operations. For instance, in response to the data set failing to satisfy the permission criteria, the permissions system 23370 may communicate the data set to the data services system 23320. In embodiments, the permissions system 23370 recognizes that the data set needs further data processing and cooperates with the data services system 23320 of the EAL 23300 to perform that processing. In these configurations, the further processing may be that the data services system 23320 generates an encoded data set that satisfies the privacy or other rules identified by the permissions system 23370 for the data set. With the encoded data set that complies with the rules identified by the permissions system 23370, the EAL 23300 converts the encoded data set to an exchangeable digital asset. This conversion may occur by the EAL 23300 publishing the encoded data set to the wallet system 23350 and configuring the interface system 23310 with access to the encoded data set in the wallet system 23350 such that market participants 23110 can access and/or request transactions for the encoded data set. On the other hand, if the permissions system 23370 determined that the data set satisfies the permission criteria, the EAL 23300 may convert the data set to an exchangeable digital asset in the same manner without the data processing encoding operation. In embodiments, encoding operations may include embedding applicable rules, such as licensing terms and conditions, for use of the data set, such that upon subsequent use of the data set such rules are automatically applied (e.g., to limit the number of seats that can access the data, to monitor and govern the number of queries or other restrictions permitted, to limit access to sensitive data contained in the data set (e.g., to allow aggregate queries but to limit queries from which private information can be deduced), to limit the location of use, to limit duration of use, to govern which systems or types of systems can access the data, or the like).

In embodiments, the EAL 23300 may be set up to operate as a data plane and control plane for the enterprise 23200. In embodiments, when operating as a data plane, the EAL 23300 may be configured to exchange assets privately-generated by an enterprise 23200 or enterprise entity that operates it. When configured in this manner, the EAL 23300 may receive an asset request from a requesting entity, such as a market participant 23110 with access to the EAL 23300 (e.g., via the interface system 23310). Here, the asset request indicates an asset that may be available for transaction, such as discovered in a wallet system 23350 (e.g., is associated with a wallet of the wallet system 23350) or other presentation interface. Based on the request, the permissions system 23370 identifies whether there are any asset controls (e.g., access controls or permissions assigned to an asset) associated with the requested asset. Here, the permissions system 23370 may have configured the asset control for the asset to indicate a control parameter that must be satisfied prior to any transactional action occurring for the asset. In some examples, the intelligence system 23330 is able to determine control parameters for the permissions system 23370 using data derived from the enterprise 23200 that privately generated the asset. In other words, the intelligence system 23330 can predict or determine a control parameter based on historical data modeling of controls for assets of the enterprise or for controls of assets similar to the assets of the enterprise.

In response to the permissions system 23370 identifying an asset control condition associated with the requested asset, the permissions system 23370 proceeds to determine whether the asset control condition is satisfied, such as, for example, by one or more parameters of the asset requests and/or by one or more attributes of the requesting entity. For instance, the asset control may designate what type of entity is able to access the asset or some set of requirements that must be met by the asset request and/or requesting entity to gain permission to access the asset (e.g., perform a transaction with the asset). In response to the asset control condition being satisfied, the EAL 23300 may facilitate fulfillment of the asset request. On the other hand, if the permissions system 23370 determines that the asset control condition is not satisfied, the requesting entity/asset request is denied. In some configurations, denial of the request generates a message that indicates the denial. This message may include some amount of information detailing the reasons for denial and/or prompting modifications in the asset request and/or requesting entity that would enable the request to be satisfied.

In some implementations, the EAL 23300 receives an asset request from a requesting entity (e.g., a market participant 23110) where the asset request indicates an asset that is available in the wallet system 23350 as an exchangeable digital asset. In these implementations, exchangeable digital assets of the enterprise 23200 correspond to one or more assets stored in a private data structure (e.g., a private blockchain) associated with an owner of the exchangeable digital assets (e.g., the enterprise 23200). Based on the request, the EAL 23300 identifies whether there are any asset controls (e.g., access controls or permissions assigned to an asset) associated with the requested asset. Here, the permissions system 23370 may have configured the asset control for the asset to indicate a control parameter that must be satisfied prior to any transactional action occurring for the asset. Similar to the prior discussed configurations of the EAL 23300, the intelligence system 23330 is able to determine control parameters for the permissions system 23370 using data derived from the enterprise 23200 that privately generated the asset.

In response to the EAL 23300 (e.g., the permissions system 23370) identifying an asset control associated with the requested asset, the permissions system 23370 proceeds to determine whether the asset control is satisfied by at least one of the asset requests or by the requesting entity. For instance, the asset control designates what type of entity is able to access the asset or some set of requirements that must be met by the asset request and/or requesting entity to gain permission to access the asset (e.g., perform a transaction with the asset). In response to the asset control being satisfied, the EAL 23300 may facilitate fulfillment of the asset request. Yet here, fulfillment of the asset request includes storing the asset in a public append-only data structure (e.g., a public blockchain) to represent a transaction involving the asset with the requesting entity. On the other hand, if the permissions system 23370 determines that the asset control fails to be satisfied, the requesting entity/asset request is denied and a denial message (as previously discussed) may be communicated to the requesting entity. With this approach, the EAL 23300 is able to function as a facilitator or executor for transactions that demand operations on both a private data structure (e.g., a private blockchain) and a public data structure (e.g., a public blockchain).

In some examples, the EAL 23300 receives a set of assets generated or controlled by the enterprise 23200. For each asset of the set of assets, the EAL 23300 may classify (e.g., using the intelligence system 23330) the respective asset into an asset category, which may include classifying the asset into an asset control category. Here, each asset category is associated with a set of rules, such as assets controls, that dictate one or more transaction parameters for the exchange of the respective asset with a third party (e.g., a market participant 23110). Moreover, for each asset of the set of assets, the EAL 23300 (e.g., using the permissions system 23370) may assign the set of asset rules for the access category classified by the EAL 23300 for the respective asset. In these examples, the EAL 23300 then converts the set of assets to exchangeable digital assets by publishing the set of assets to the wallet system 23350 and configuring the interface system 23310 with access to the set of the wallet system 23350. In embodiments, asset categories may be associated with a defined set of marketplaces, exchanges, or other environments in which assets may be transacted, such that a set of rules appropriate for the classified asset may be derived by reference to the governing rules of the applicable transaction environment; for example, assets classified as commodities may be governed by rules of a commodities exchange, assets classified as securities may be governed by rules of a securities exchange, assets classified as cryptocurrencies may be governed by rules of a cryptocurrency exchange, and the like. Asset classification may be learned using any of the artificial intelligence or learning techniques described herein, such as on a training data set of historical transactions (e.g., by observing which type of asset objects are traded in which environments), by training on human classification interactions (such as tagging of assets), and the like. Training may be seeded or assisted by a model, such as an asset classification model that classifies or clusters assets based on data object parameters. This may include a hierarchical model or graph with classes and subclasses of asset types.

In some embodiments, the EAL 23300 may also function as a type of monitoring system. For example, the EAL 23300 may be configured to automatically monitor or mine for potential deals or transactions that could involve the enterprise assets that it manages and/or to monitor or mine for opportunities to acquire assets that it wishes to acquire. In some configurations, the EAL 23300 monitors (e.g., via its interface system 23310) a plurality of market participants 23110. While monitoring the plurality of market participants 23110, the EAL 23300 may receive an indication that a monitored market participant 23110 requests or offers an asset candidate or type of asset. In the case of a request for an asset or type, the EAL 23300 determines (e.g., via using the intelligence system 23330) whether the asset candidate matches (or is similar to) an asset available in the wallet system 23350 associated with the EAL 23300. If the asset candidate does not match any available assets in the wallet system 23350, the EAL 23300 may continue to perform monitoring services for other asset candidates. In the case of offers, the EAL 23300 may receive an indication of the parameters of an offer of a digital asset or type, compare the offer to a set of desired transaction parameters, and, if the parameters are satisfied, initiate a transaction to acquire the asset.

In response to a request matching an asset available in the wallet system 23350, the EAL 23300 may be configured to perform a set of operations that further analyze whether to engage or to offer to engage in an asset transaction with the monitored market participant 23110. These operations may include identifying a set of asset control conditions managed by the permissions system 23370 of the EAL 23300 and determining whether a transaction (e.g., a digital exchange) with the monitored market participant 23110 satisfies an asset control criterion corresponding to the asset available in the wallet system 23350 (i.e., the matching asset). For instance, the asset control criterion may indicate that a threshold number has been exceeded. In response to determining that the transaction with the monitored market participant 23110 that involves the asset available in the wallet system 23350 satisfies any asset control criteria (e.g., does not violate a threshold), the EAL 23300 may generate a message data packet that proposes an actual transaction with the market participant 23110 involving the asset available. In some examples, the interface system 23310 communicates the message data packet on behalf of the EAL 23300 to the market participant 23110.

In embodiments, an EAL 23300 may be configured as a multi-tenant EAL 23300, where the functions and capabilities of the EAL 23300 are made available to more than one enterprise (or to more than one business unit of an enterprise), such that processing resources and facilities (e.g., data centers and network infrastructure), operating resources (such as personnel), and others are shared across tenants, while the functions and capabilities of the EAL 23300 are governed and executed with awareness of the access rights and other attributes of each tenant. For example, two (or more) enterprises may share an EAL 23300, such as where the enterprises operate in a similar domain and/or undertake similar transactions, such that the marketplaces, exchanges, or other transactions with which the EAL 23300 are similar for the two enterprises. The EAL 23300 may monitor usage of each tenant, provision resources (such as according to relative priorities), maintain separation of enterprise-specific elements (e.g., wallets of each enterprise), handle billing transactions for usage, and the like. In embodiments, transactions across multiple tenants may be aggregated to achieve volume discounts, with discounts being automatically allocated and applied according to a set of rules (such as based on proportionate contribution to transactions, or the like). In embodiments, tenancy may be managed in a set of tiers, such as with each tier having a set of service levels associated therewith, such as enabling usage of given sets of functions and capabilities of the EAL 23300, setting relative prioritization (e.g., with higher tiers being given priority where transactions are limited, where resources are limited, or the like), and the like.

In embodiments, the EAL 23300 may be configured for peer-to-peer connectivity among a set of enterprises (e.g., bilateral connectivity or multilateral connectivity), such that the functions and capabilities of the EAL 23300 are configured to handle the particular types of assets, resources, workflows and transactions that occur among the enterprises. For example, a bank and a manufacturing entity may establish a peer-to-peer EAL 23300 for a set of financial transactions, including working capital loans, trade credit lending, handling of deposits, payroll processing, payments processing, and others. In this example, the assets of the manufacturing enterprise may be presented in a wallet in the EAL 23300 that is on accessible to the manufacturing entity and to lending officers of the bank, such that the lending assets can be configured to be used as collateral for lending transactions. For example, the EAL may facilitate automated generation of sets for collateral for a set of loans among the manufacturing enterprise and the bank. In another example, a third entity, such as a secondary lender, underwriter, insurer, or the like may be added to the EAL 23300, such as to facilitate multi-party transactions. In other embodiments, a multi-party, peer-to-peer EAL 23300 may handle transactions among a set of parties participating in a supply chain, such as tiers of component manufacturers that provide components of systems manufactured by an OEM. A peer-to-peer EAL 23300 may be established between a manufacturer or retailer with a set of preferred customers, such as repeat customers, such that the EAL allows the preferred customers access to view inventories (as presented in a wallet) in a manner that has priority over the access by the general public. The peer-to-peer EAL 23300 may include governing rules that are customized to each party (e.g., setting rules for what assets and transactions are presented or permitted), may provision and prioritize resources (e.g., for storage, processing, networking or the like) among parties, may allocate costs, and the like. The configured services of the EAL 23300 (of any of the types described herein), may include ones that are configured for the needs of each party, such as by learning on historical transactions of that party and/or on similarly situated other parties (such as ones from similar domains). In some embodiments, the peer-to-peer EAL 23300 may be a multi-tenant, peer-to-peer EAL 23300 having features described above.

Although the EAL 23300 has been generally described with respect to digital enterprise asset functionality, the EAL 23300 is not limited to digital assets, but may also perform its functionality for non-digital assets. For example, for a non-digital enterprise asset, the EAL 23300 may facilitate non-asset transactions by: managing transactional parties, permissions, logistics, or recordation of a transaction in some manner; providing intermediary services (e.g., escrow services for a physical transaction, authentication services, etc.); generating a digital means (e.g., a token or a transactional record) to indicate that a non-digital asset transaction has occurred; or processing/storing digital files related to a non-digital asset. As previously described, a physical resource, which may be considered a non-digital enterprise asset, may have associated documentation (e.g., certificate of authenticity, proof of purchase, deed, title, etc.). With associated documentation that can be generated, modified, transferred, processed, and/or stored in a digital context, the EAL 23300 can function to represent and/or manage some of all of these transactional instances.

In some implementations, the EAL 23300 may be configured to perform the transaction and/or to generate a record of the transaction for digital storage. For instance, the EAL 23300 generates a record of the transaction and stores the record on one or more blockchains (e.g., private blockchain associated with the enterprise and/or a public blockchain). In some configurations, similar to a digital asset transaction, when the EAL 23300 is integrated with the performance of a non-digital asset transaction, the capabilities of the EAL 23300 may generate records that store detailed information regarding a transaction. This detailed information may be information such as the enterprise's agent who authorized the transaction, any permissions required or satisfied to perform the transaction, any governance involved to perform the transaction, any decision-making intelligence requested/relied upon to perform the transaction, any data processing/data retrieval involved to perform the transaction, etc. In other words, the detailed information can log or record services performed by EAL systems or entities in cooperation with EAL systems.

Intelligence Services System

FIG. 235 illustrates an example intelligence services system 23500 (also referred to as "intelligence services") according to some embodiments of the present disclosure. In embodiments, the intelligence services 23500 provides a framework for providing intelligence services to one or more intelligence service clients 23536. In some embodiments, the intelligence services 23500 framework may be adapted to be at least partially replicated in respective intelligence clients 23536 (e.g., an enterprise access layer, a wallet system, a market orchestration system, a digital lending system, an asset-backed tokenization system, and/or the like). In these embodiments, an individual client 23536 may include some or all of the capabilities of the intelligence services 23500, whereby the intelligence services 23500 is adapted for the specific functions performed by the subsystems of the intelligence client. Additionally or alternatively, in some embodiments, the intelligence services 23500 may be implemented as a set of microservices, such that different intelligence clients 23536 may leverage the intelligence services 23500 via one or more APIs exposed to the intelligence clients. In these embodiments, the intelligence services 23500 may be configured to perform various types of intelligence services that may be adapted for different intelligence clients 23536. In either of these configurations, an intelligence service client 23536 may provide an intelligence request to the intelligence services 23500, whereby the request is to perform a specific intelligence task (e.g., a decision, a recommendation, a report, an instruction, a classification, a prediction, a training action, an NLP request, or the like). In response, the intelligence services 23500 executes the requested intelligence task and returns a response to the intelligence service client 23536. Additionally or alternatively, in some embodiments, the intelligence services 23500 may be implemented using one or more specialized chips that are configured to provide AI assisted microservices such as image processing, diagnostics, location and orientation, chemical analysis, data processing, and so forth. Examples of AI-enabled chips are discussed elsewhere in the disclosure.

In embodiments, an intelligence services 23500 may include an intelligence service controller 23502 and artificial intelligence (AI) modules 23504. In embodiments, an artificial intelligence services 23500 receives an intelligence request from an intelligence service client 23536 and any required data to process the request from the intelligence service client 23536. In response to the request and the specific data, one or more implicated artificial intelligence modules 23504 perform the intelligence task and output an "intelligence response". Examples of intelligence modules 23504 responses may include a decision (e.g., a control instruction, a proposed action, machine-generated text, and/or the like), a prediction (e.g., a predicted meaning of a text snippet, a predicted outcome associated with a proposed action, a predicted fault condition, and/or the like), a classification (e.g., a classification of an object in an image, a classification of a spoken utterance, a classified fault condition based on sensor data, and/or the like), and/or other suitable outputs of an artificial intelligence system.

Artificial Intelligence Modules

In embodiments, artificial intelligence modules 23504 may include an ML module 23512, a rules-based module 23528, an analytics module 23518, an RPA module 23516, a digital twin module 23520, a machine vision module 23522, an NLP module 23524, and/or a neural network module 23514. It is appreciated that the foregoing are non-limiting examples of artificial intelligence modules, and that some of the modules may be included or leveraged by other artificial intelligence modules. For example, the NLP module 23524 and the machine vision module 23522 may leverage different neural networks that are part of the neural network module 23514 in performance of their respective functions.

It is further noted that in some scenarios, artificial intelligence modules 23504 themselves may also be intelligence clients 23536. For example, a rules-based intelligence module 23528 may request an intelligence task from an ML module 23512 or a neural network F41 module 23514, such as requesting a classification of an object appearing in a video and/or a motion of the object. In this example, the rules-based intelligence module 23528 may be an intelligence service client 23536 that uses the classification to determine whether to take a specified action. In another example, a machine vision module 23522 may request a digital twin of a specified environment from a digital twin module 23520, such that the ML module 23512 may request specific data from the digital twin as features to train a machine-learned model that is trained for a specific environment.

In embodiments, an intelligence task may require specific types of data to respond to the request. For example, a machine vision task requires one or more images (and potentially other data) to classify objects appearing in an image or set of images, to determine features within the set of images (such as locations of items, presence of faces, symbols or instructions, expressions, parameters of motion, changes in status, and many others), and the like. In another example, an NLP task requires audio of speech and/or text data (and potentially other data) to determine a meaning or other element of the speech and/or text. In yet another example, an AI-based control task (e.g., a decision on movement of a robot) may require environment data (e.g., maps, coordinates of known obstacles, images, and/or the like) and/or a motion plan to make a decision as to how to control the motion of a robot. In a platform-level example, an analytics-based reporting task may require data from a number of different databases to generate a report. Thus, in embodiments, tasks that can be performed by an intelligence services 23500 may require, or benefit from, specific intelligence service inputs 23532. In some embodiments, an intelligence services 23500 may be configured to receive and/or request specific data from the intelligence service inputs 23532 to perform a respective intelligence task. Additionally or alternatively, the requesting intelligence service client 23536 may provide the specific data in the request. For instance, the intelligence services 23500 may expose one or more APIs to the intelligence clients 23536, whereby a requesting client 23536 provides the specific data in the request via the API. Examples of intelligence service inputs may include, but are not limited to, sensors that provide sensor data, video streams, audio streams, databases, data feeds, human input, and/or other suitable data.

In embodiments, intelligence modules 23504 includes and provides access to an ML module 23512 that may be integrated into or be accessed by one or more intelligence clients 23536. In embodiments, the ML module 23512 may provide machine-based learning capabilities, features, functions, and algorithms for use by an intelligence service client 23536 such as training ML models, leveraging ML models, reinforcing ML models, performing various clustering techniques, feature extraction, and/or the like. In an example, a machine learning module 23512 may provide machine learning computing, data storage, and feedback infrastructure to a simulation system (e.g., as described above). The machine learning module 23512 may also operate cooperatively with other modules, such as the rules-based module 23528, the machine vision module 23522, the RPA module 23516, and/or the like.

The machine learning module 23512 may define one or more machine learning models for performing analytics, simulation, decision making, and predictive analytics related to data processing, data analysis, simulation creation, and simulation analysis of one or more components or subsystems of an intelligence service client 23536. In embodiments, the machine learning models are algorithms and/or statistical models that perform specific tasks without using explicit instructions, relying instead on patterns and inference. The machine learning models build one or more mathematical models based on training data to make predictions and/or decisions without being explicitly programmed to perform the specific tasks. In example implementations, machine learning models may perform classification, prediction, regression, clustering, anomaly detection, recommendation generation, and/or other tasks.

In embodiments, the machine learning models may perform various types of classification based on the input data. Classification is a predictive modeling problem where a class label is predicted for a given example of input data. For example, machine learning models can perform binary classification, multi-class or multi-label classification. In embodiments, the machine-learning model may output "confidence scores" that are indicative of a respective confidence associated with classification of the input into the respective class. In embodiments, the confidence scores can be compared to one or more thresholds to render a discrete categorical prediction. In embodiments, only a certain number of classes (e.g., one) with the relatively largest confidence scores can be selected to render a discrete categorical prediction.

In embodiments, machine learning models may output a probabilistic classification. For example, machine learning models may predict, given a sample input, a probability distribution over a set of classes. Thus, rather than outputting only the most likely class to which the sample input should belong, machine learning models can output, for each class, a probability that the sample input belongs to such class. In embodiments, the probability distribution over all possible classes can sum to one. In embodiments, a Softmax function, or other type of function or layer can be used to turn a set of real values respectively associated with the possible classes to a set of real values in the range (0, 1) that sum to one. In embodiments, the probabilities provided by the probability distribution can be compared to one or more thresholds to render a discrete categorical prediction. In embodiments, only a certain number of classes (e.g., one) with the relatively largest predicted probability can be selected to render a discrete categorical prediction.

In embodiments, machine learning models can perform regression to provide output data in the form of a continuous numeric value. As examples, machine learning models can perform linear regression, polynomial regression, or nonlinear regression. As described, in embodiments, a Softmax function or other function or layer can be used to squash a set of real values respectively associated with a two or more possible classes to a set of real values in the range (0, 1) that sum to one. For example, machine learning models can perform linear regression, polynomial regression, or nonlinear regression. As examples, machine learning models can perform simple regression or multiple regression. As described above, in some implementations, a Softmax function or other function or layer can be used to squash a set of real values respectively associated with a two or more possible classes to a set of real values in the range (0, 1) that sum to one.

In embodiments, machine learning models may perform various types of clustering. For example, machine learning models may identify one or more previously-defined clusters to which the input data most likely corresponds. In some implementations in which machine learning models performs clustering, machine learning models can be trained using unsupervised learning techniques.

In embodiments, machine learning models may perform anomaly detection or outlier detection. For example, machine learning models can identify input data that does not conform to an expected pattern or other characteristic (e.g., as previously observed from previous input data). As examples, the anomaly detection can be used for fraud detection or system failure detection.

In some implementations, machine learning models can provide output data in the form of one or more recommendations. For example, machine learning models can be included in a recommendation system or engine. As an example, given input data that describes previous outcomes for certain entities (e.g., a score, ranking, or rating indicative of an amount of success or enjoyment), machine learning models can output a suggestion or recommendation of one or more additional entities that, based on the previous outcomes, are expected to have a desired outcome As described above, machine learning models can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine learning models can be or include one or more classifier models such as, for example, linear classification models; quadratic classification models; etc. Machine learning models may be or include one or more regression models such as, for example, simple linear regression models; multiple linear regression models; logistic regression models; stepwise regression models; multivariate adaptive regression splines; locally estimated scatterplot smoothing models; etc.

In some examples, machine learning models can be or include one or more decision tree-based models such as, for example, classification and/or regression trees; chi-squared automatic interaction detection decision trees; decision stumps; conditional decision trees; etc.

Machine learning models may be or include one or more kernel machines. In some implementations, machine learning models can be or include one or more support vector machines. Machine learning models may be or include one or more instance-based learning models such as, for example, learning vector quantization models; self-organizing map models; locally weighted learning models; etc. In some implementations, machine learning models can be or include one or more nearest neighbor models such as, for example, k-nearest neighbor classifications models; k-nearest neighbors regression models; etc. Machine learning models can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

Machine learning models may include one or more clustering models such as, for example, k-means clustering models; k-medians clustering models; expectation maximization models; hierarchical clustering models; etc.

In some implementations, machine learning models can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine learning models can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In embodiments, artificial intelligence modules 23504 may include and/or provide access to a neural network module 23514. In embodiments, the neural network module 23514 is configured to train, deploy, and/or leverage artificial neural networks (or "neural networks") on behalf of an intelligence service client 23536. It is noted that in the description, the term machine learning model may include neural networks, and as such, the neural network module 23514 may be part of the machine learning module 23512. In embodiments, the neural network module 23514 may be configured to train neural networks that may be used by the intelligence clients 23536. Non-limiting examples of different types of neural networks may include any of the neural network types described throughout this disclosure and the documents incorporated herein by reference, including without limitation convolutional neural networks (CNN), deep convolutional neural networks (DCN), feed forward neural networks (including deep feed forward neural networks), recurrent neural networks (RNN) (including without limitation gated RNNs), long/short term memory (LTSM) neural networks, and the like, as well as hybrids or combinations of the above, such as deployed in series, in parallel, in acyclic (e.g., directed graph-based) flows, and/or in more complex flows that may include intermediate decision nodes, recursive loops, and the like, where a given type of neural network takes inputs from a data source or other neural network and provides outputs that are included within the input sets of another neural network until a flow is completed and a final output is provided. In embodiments, the neural network module 23514 may be leveraged by other artificial intelligence modules 23504, such as the machine vision module 23522, the NLP module 23524, the rules-based module 23528, the digital twin module 23526, and so on. Example applications of the neural network module 23514 are described throughout the disclosure.

A neural network includes a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

In embodiments, the neural networks can be or include one or more feed forward neural networks. In feed forward networks, the connections between nodes do not form a cycle. For example, each connection can connect a node from an earlier layer to a node from a later layer.

In embodiments, the neural networks can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc. In some example embodiments, recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some examples, neural networks can be or include one or more non-recurrent sequence-to-sequence models based on self-attention, such as Transformer networks. Details of an exemplary transformer network can be found at http://papers.nips.cc/paper/7181-attention-is-all-you-need.pdf.

In embodiments, the neural networks can be or include one or more convolutional neural networks. In some instances, a convolutional neural network can include one or more convolutional layers that perform convolutions over input data using learned filters. Filters can also be referred to as kernels. Convolutional neural networks can be especially useful for vision problems such as when the input data includes imagery such as still images or video. However, convolutional neural networks can also be applied for natural language processing.

In embodiments, the neural networks can be or include one or more generative networks such as, for example, generative adversarial networks. Generative networks can be used to generate new data such as new images or other content.

In embodiments, the neural networks may be or include autoencoders. In some instances, the aim of an autoencoder is to learn a representation (e.g., a lower-dimensional encoding) for a set of data, typically for the purpose of dimensionality reduction. For example, in some instances, an autoencoder can seek to encode the input data and then provide output data that reconstructs the input data from the encoding. Recently, the autoencoder concept has become more widely used for learning generative models of data. In some instances, the autoencoder can include additional losses beyond reconstructing the input data.

In embodiments, the neural networks may be or include one or more other forms of artificial neural networks such as, for example, deep Boltzmann machines; deep belief networks; stacked autoencoders; etc. Any of the neural networks described herein can be combined (e.g., stacked) to form more complex networks.

FIG. 236 illustrates an example neural network with multiple layers. Neural network 23540 may include an input layer, a hidden layer, and an output layer with each layer comprising a plurality of nodes or neurons that respond to different combinations of inputs from the previous layers. The connections between the neurons have numeric weights that determine how much relative effect an input has on the output value of the node in question. Input layer may include a plurality of input nodes 23542, 23544, 23546, 23548 and 23550 that may provide information from the outside world or input data (e.g., sensor data, image data, text data, audio data, etc.) to the neural network 23540. The input data may be from different sources and may include library data x1, simulation data x2, user input data x3, training data x4 and outcome data x5. The input nodes 23542, 23544, 23546, 23548 and 23550 may pass on the information to the next layer, and no computation may be performed by the input nodes. Hidden layers may include a plurality of nodes, such as nodes 23552, 23554, and 23556. The nodes in the hidden layer 23552, 23554, and 23556 may process the information from the input layer based on the weights of the connections between the input layer and the hidden layer and transfer information to the output layer. Output layer may include an output node 23558 which processes information based on the weights of the connections between the hidden layer and the output layer and is responsible for computing and transferring information from the network to the outside world, such as recognizing certain objects or activities, or predicting a condition or an action.

In embodiments, a neural network 23540 may include two or more hidden layers and may be referred to as a deep neural network. The layers are constructed so that the first layer detects a set of primitive patterns in the input (e.g., image) data, the second layer detects patterns of patterns and the third layer detects patterns of those patterns. In some embodiments, a node in the neural network 23540 may have connections to all nodes in the immediately preceding layer and the immediate next layer. Thus, the layers may be referred to as fully-connected layers. In some embodiments, a node in the neural network 23540 may have connections to only some of the nodes in the immediately preceding layer and the immediate next layer. Thus, the layers may be referred to as sparsely-connected layers. Each neuron in the neural network consists of a weighted linear combination of its inputs and the computation on each neural network layer may be described as a multiplication of an input matrix and a weight matrix. A bias matrix is then added to the resulting product matrix to account for the threshold of each neuron in the next level. Further, an activation function is applied to each resultant value, and the resulting values are placed in the matrix for the next layer. Thus, the output from a node i in the neural network may be represented as:

$$yi=f(\Sigma xiwi+bi)$$

where f is the activation function, Σxiwi is the weighted sum of input matrix and bi is the bias matrix.

The activation function determines the activity level or excitation level generated in the node as a result of an input signal of a particular size. The purpose of the activation function is to introduce non-linearity into the output of a neural network node because most real-world functions are non-linear and it is desirable that the neurons can learn these non-linear representations. Several activation functions may be used in an artificial neural network. One example activation function is the sigmoid function σ(x), which is a continuous S-shaped monotonically increasing function that asymptotically approaches fixed values as the input approaches plus or minus infinity. The sigmoid function σ(x) takes a real-valued input and transforms it into a value between 0 and 1:

$$\sigma(x)=1/(1+\exp(-x)).$$

Another example activation function is the tanh function, which takes a real-valued input and transforms it into a value within the range of [−1, 1]:

$$\tan h(x)=2\sigma(2x)-1$$

A third example activation function is the rectified linear unit (ReLU) function. The ReLU function takes a real-valued input and thresholds it above zero (i.e., replacing negative values with zero):

$$f(x)=\max(0,x).$$

It will be apparent that the above activation functions are provided as examples and in various embodiments, neural network 23540 may utilize a variety of activation functions including (but not limited to) identity, binary step, logistic, soft step, tan h, arctan, softsign, rectified linear unit (ReLU), leaky rectified linear unit, parameteric rectified linear unit, randomized leaky rectified linear unit, exponential linear unit, s-shaped rectified linear activation unit, adaptive piecewise linear, softplus, bent identity, softexponential, sinusoid, sinc, gaussian, softmax, maxout, and/or a combination of activation functions.

In the example shown in FIG. 236, nodes 23542, 23544, 23546, 23548 and 23550 in the input layer may take external inputs x1, x2, x3, x4 and x5 which may be numerical values depending upon the input dataset. It will be understood that even though only five inputs are shown in FIG. 236, in various implementations, a node may include tens, hundreds, thousands, or more inputs. As discussed above, no computation is performed on the input layer and thus the outputs from nodes 23542, 23544, 23546, 23548 and 23550 of input layer are x1, x2, x3, x4 and x5 respectively, which are fed into hidden layer. The output of node 23552 in the hidden layer may depend on the outputs from the input layer (x1, x2, x3, x4 and x5) and weights associated with connections (w1, w2, w3, w4 and w5). Thus, the output from node 23552 may be computed as:

$$Y_{23552}=f(x1w1+x2w2+x3w3+x4w4+x5w5+b_{23552}).$$

The outputs from the nodes 23554 and 23556 in the hidden layer may also be computed in a similar manner and then be fed to the node 23558 in the output layer. Node 23558 in the output layer may perform similar computations (using weights v1, v2 and v3 associated with the connections) as the nodes 23552, 23554 and 23556 in the hidden layers:

$$Y_{23558}=f(y_{23552}v1+y_{23554}v2+y_{23556}v3+b_{23558});$$

where $Y_{23540}$ is the output of the neural network 23540.

As mentioned, the connections between nodes in the neural network have associated weights, which determine how much relative effect an input value has on the output value of the node in question. Before the network is trained, random values are selected for each of the weights. The weights are adjusted during the training process and this adjustment of weights to determine the best set of weights that maximize the accuracy of the neural network is referred to as training. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

In embodiments, backpropagation (e.g., backward propagation of errors) is utilized with an optimization method such as gradient descent to adjust weights and update the neural network characteristics. Backpropagation may be a supervised training scheme that learns from labeled training data and errors at the nodes by changing parameters of the neural network to reduce the errors. For example, a result of forward propagation (e.g., output activation value(s)) determined using training input data is compared against a corresponding known reference output data to calculate a loss function gradient. The gradient may be then utilized in an optimization method to determine new updated weights in an attempt to minimize a loss function. For example, to measure error, the mean square error is determined using the equation:

$$E=(\text{target}-\text{output})^2$$

To determine the gradient for a weight "w," a partial derivative of the error with respect to the weight may be determined, where:

$$\text{gradient}=\partial E/\partial w$$

The calculation of the partial derivative of the errors with respect to the weights may flow backwards through the node levels of the neural network. Then a portion (e.g., ratio, percentage, etc.) of the gradient is subtracted from the weight to determine the updated weight. The portion may be specified as a learning rate "a." Thus an example equation of determining the updated weight is given by the formula:

$$w\ \text{new}=w\ \text{old}-\alpha\partial E/\partial w$$

The learning rate must be selected such that it is not too small (e.g., a rate that is too small may lead to a slow convergence to the desired weights) and not too large (e.g., a rate that is too large may cause the weights to not converge to the desired weights).

After the weight adjustment, the network should perform better than before for the same input because the weights have now been adjusted to minimize the errors.

As mentioned, neural networks may include convolutional neural networks (CNN). A CNN is a specialized neural network for processing data having a known, grid-like topology, such as image data. Accordingly, CNNs are commonly used for classification, object recognition and computer vision applications, but they also may be used for other types of pattern recognition such as speech and language processing.

A convolutional neural network learns highly non-linear mappings by interconnecting layers of artificial neurons arranged in many different layers with activation functions that make the layers dependent. It includes one or more convolutional layers, interspersed with one or more sub-sampling layers and non-linear layers, which are typically followed by one or more fully connected layers.

Referring to FIG. 237, a CNN 23560 includes an input layer with an input image 23562 to be classified by the CNN 23560, a hidden layer which in turn includes one or more convolutional layers, interspersed with one or more activation or non-linear layers (e.g., ReLU) and pooling or sub-sampling layers and an output layer-typically including one or more fully connected layers. Input image 23562 may be represented by a matrix of pixels and may have multiple channels. For example, a colored image may have a red, a green, and blue channels each representing red, green, and blue (RGB) components of the input image. Each channel may be represented by a 2-D matrix of pixels having pixel values in the range of 0 to 255. A gray-scale image on the other hand may have only one channel. The following section describes processing of a single image channel using CNN 23560. It will be understood that multiple channels may be processed in a similar manner.

As shown, input image 23562 may be processed by the hidden layer, which includes sets of convolutional and activation layers 23564 and 23568, each followed by pooling layers 23566 and 23570.

The convolutional layers of the convolutional neural network serve as feature extractors capable of learning and decomposing the input image into hierarchical features. The convolution layers may perform convolution operations on the input image where a filter (also referred as a kernel or feature detector) may slide over the input image at a certain step size (referred to as the stride). For every position (or step), element-wise multiplications between the filter matrix and the overlapped matrix in the input image may be calculated and summed to get a final value that represents a single element of an output matrix constituting a feature map. The feature map refers to image data that represents various features of the input image data and may have smaller dimensions as compared to the input image. The activation or non-linear layers use different non-linear trigger functions to signal distinct identification of likely features on each hidden layer. Non-linear layers use a variety of specific functions to implement the non-linear triggering, including the rectified linear units (ReLUs), hyperbolic tangent, absolute of hyperbolic tangent and sigmoid functions. In one implementation, a ReLU activation implements the function y=max(x, 0) and keeps the input and output sizes of a layer the same. The advantage of using ReLU is that the convolutional neural network is trained many times faster. ReLU is a non-continuous, non-saturating activation function that is linear with respect to the input if the input values are larger than zero and zero otherwise.

As shown in FIG. 237, the first convolution and activation layer 23564 may perform convolutions on input image 23562 using multiple filters followed by non-linearity operation (e.g., ReLU) to generate multiple output matrices (or feature maps) 23572. The number of filters used may be referred to as the depth of the convolution layer. Thus, the first convolution and activation layer 23564 in the example of FIG. 237 has a depth of three and generates three feature maps using three filters. Feature maps 23572 may then be passed to the first pooling layer that may sub-sample or down-sample the feature maps using a pooling function to generate output matrix 23574. The pooling function replaces the feature map with a summary statistic to reduce the spatial dimensions of the extracted feature map thereby reducing the number of parameters and computations in the network. Thus, the pooling layer reduces the dimensionality of the feature maps while retaining the most important information. The pooling function can also be used to introduce translation invariance into the neural network, such that small translations to the input do not change the pooled outputs. Different pooling functions may be used in the pooling layer, including max pooling, average pooling, and 12-norm pooling.

Output matrix 23574 may then be processed by a second convolution and activation layer 23568 to perform convolutions and non-linear activation operations (e.g., ReLU) as described above to generate feature maps 23576. In the example shown in FIG. 237, second convolution and activation layer 23568 may have a depth of five. Feature maps 23576 may then be passed to a pooling layer 23570, where feature maps 23576 may be subsampled or down-sampled to generate an output matrix 23578.

Output matrix 23578 generated by pooling layer 23570 is then processed by one or more fully connected layer 23580 that forms a part of the output layer of CNN 23560. The fully connected layer 23580 has a full connection with all the feature maps of the output matrix 23578 of the pooling layer 23570. In embodiments, the fully connected layer 23580 may take the output matrix 23578 generated by the pooling layer 23570 as the input in vector form, and perform high-level determination to output a feature vector containing information of the structures in the input image. In embodiments, the fully-connected layer 23580 may classify the object in input image 23562 into one of several categories using a Softmax function. The Softmax function may be used as the activation function in the output layer and takes a vector of real-valued scores and maps it to a vector of values between zero and one that sum to one. In embodiments, other classifiers, such as a support vector machine (SVM) classifier, may be used.

In embodiments, one or more normalization layers may be added to the CNN 23560 to normalize the output of the convolution filters. The normalization layer may provide whitening or lateral inhibition, avoid vanishing or exploding gradients, stabilize training, and enable learning with higher rates and faster convergence. In embodiments, the normalization layers are added after the convolution layer but before the activation layer.

CNN 23560 may thus be seen as multiple sets of convolution, activation, pooling, normalization and fully connected layers stacked together to learn, enhance and extract implicit features and patterns in the input image 23562. A layer as used herein, can refer to one or more components that operate with similar function by mathematical or other functional means to process received inputs to generate/derive outputs for a next layer with one or more other components for further processing within CNN 23560.

The initial layers of CNN 23560 e.g., convolution layers, may extract low level features such as edges and/or gradients from the input image 23562. Subsequent layers may extract or detect progressively more complex features and patterns such as presence of curvatures and textures in image data and so on. The output of each layer may serve as an input of a succeeding layer in CNN 23560 to learn hierarchical feature representations from data in the input image 23562. This allows convolutional neural networks to efficiently learn increasingly complex and abstract visual concepts.

Although only two convolution layers are shown in the example, the present disclosure is not limited to the example architecture, and CNN 23560 architecture may comprise any number of layers in total, and any number of layers for convolution, activation and pooling. For example, there have been many variations and improvements over the basic CNN model described above. Some examples include Alexnet, GoogLeNet, VGGNet (that stacks many layers containing narrow convolutional layers followed by max pooling layers), Residual network or ResNet (that uses residual blocks and skip connections to learn residual mapping), DenseNet (that connects each layer of CNN to every other layer in a feed-forward fashion), Squeeze and excitation networks (that incorporate global context into features) and AmobeaNet (that uses evolutionary algorithms to search and find optimal architecture for image recognition).

Training of Convolutional Neural Network

The training process of a convolutional neural network, such as CNN 23560, may be similar to the training process discussed in FIG. 236 with respect to neural network 23540.

In embodiments, all parameters and weights (including the weights in the filters and weights for the fully-connected layer are initially assigned (e.g., randomly assigned). Then, during training, a training image or images, in which the objects have been detected and classified, are provided as the input to the CNN 23560, which performs the forward propagation steps. In other words, CNN 23560 applies convolution, non-linear activation, and pooling layers to each training image to determine the classification vectors (i.e., detect and classify each training image). These classification vectors are compared with the predetermined classification vectors. The error (e.g., the squared sum of differences, log loss, softmax log loss) between the classification vectors of the CNN and the predetermined classification vectors is determined. This error is then employed to update the weights and parameters of the CNN in a backpropagation process which may use gradient descent and may include one or more iterations. The training process is repeated for each training image in the training set.

The training process and inference process described above may be performed on hardware, software, or a combination of hardware and software. However, training a convolutional neural network like CNN 23560 or using the trained CNN for inference generally requires significant amounts of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for training and/or inference. Training and inference may be performed on a cloud, on a data center, or on a device.

Region Based CNNs (RCNNs) and Object Detection

In embodiments, an object detection model extends the functionality of CNN based image classification neural network models by not only classifying objects but also determining their locations in an image in terms of bounding boxes. Region-based CNN (R-CNN) methods are used to extract regions of interest (ROI), where each ROI is a rectangle that may represent the boundary of an object in image. Conceptually, R-CNN operates in two phases. In a first phase, region proposal methods generate all potential bounding box candidates in the image. In a second phase, for every proposal, a CNN classifier is applied to distinguish between objects. Alternatively, a fast R-CNN architecture can be used, which integrates the feature extractor and classifier into a unified network. Another faster R-CNN can be used, which incorporates a Region Proposal Network (RPN) and fast R-CNN into an end-to-end trainable framework. Mask R-CNN adds instance segmentation, while mesh R-CNN adds the ability to generate a 3D mesh from a 2D image.

Referring back to FIG. 235, in embodiments, the artificial intelligence modules 23504 may provide access to and/or integrate a robotic process automation (RPA) module 23516. The RPA module 23516 may facilitate, among other things, computer automation of producing and validating workflows. The RPA module 23516 provides automation of tasks performed by humans, such as receiving and reviewing written information, entering data into user interfaces, converting or otherwise processing data such as files or records, recording observations, generating documents such as reports, and communicating with other users by mechanisms such as email. In some cases, the tasks involve a workflow that includes a number of interrelated steps, contextual information that relates to the task, and interactions with other applications and humans. The RPA module 23516 can be configured to receive or learn one or more such workflows on behalf of the human and in a manner similar to the actions and logic of the human, and can thereafter perform such workflows in response to various triggers such as events. Examples of RPA modules 23516 may encompass those in this disclosure and in the documents incorporated by reference herein and may involve automation of any of the wide range of value chain network activities or entities described therein.

In embodiments, an RPA module 23516 is configured to receive or learn a robotic process automation workflow in a variety of ways. As a first example, in embodiments, the RPA module 23516 can include a graphical user interface (GUI) that enables a user to specify the details of the robotic process automation workflow. The GUI can include components that represent different types of actions, such as an action of receiving input from a user or application, an action of converting or otherwise processing data, and an action of providing input to an application. The GUI can receive, from the user, a selection of components representing actions that correspond to the steps of the workflow when performed by a human. The GUI can also receive, from the user, an interconnection of the selected components, such as a logical order in which the corresponding actions are to be performed, or a dependency of one component upon another component (e.g., a first component can output data that is received as input by another component). The GUI can include one or more templates, such as one or more sequences of actions that are performed together to complete a common workflow. The GUI can receive, from the user, a selection of a template, optionally including one or more details that adapt the selected template to a particular workflow performed by the human. Based on the input received from the user, the RPA module 23516 can generate a robotic process automation workflow that can be executed to perform the workflow. The RPA module 23516 can store the generated workflow for future use. For example, the RPA module 23516 can execute the compiled code or interpret the generated script to perform the workflow in a similar manner as performed by the human.

As a second example, in embodiments, an RPA module 23516 is configured to receive or learn a workflow based on a set of rules. For example, the RPA module 23516 can include a GUI that enables a user to specify the details of the robotic process automation workflow as a set of conditions and responsive actions. The GUI includes a set of components that respond to conditions to be monitored, such as a status of a resource or an occurrence of an event. The GUI for designing the workflows can include a set of components that represent actions to be taken in response to an occurrence of one of the conditions. The GUI can receive, from the user, a selection of components representing one or more of the conditions of a workflow, and a selection of one or more components representing the actions to be taken in response to the conditions. In some embodiments, the GUI can include one or more templates, such as one or more conditions associated with one or more actions that correspond to a common workflow. The GUI can receive, from the user, a selection of one of the templates, including one or more details that adapt the selected template to a particular workflow performed by the human. Based on the input received from the user, the RPA module 23516 can generate a robotic process automation workflow that automates a set of tasks in response to one or more detected events. The RPA module 23516 can store the generated workflow for future use. For example, the RPA module 23516 can monitor the selected conditions and perform the selected actions in response to an occurrence of the selected actions, in a similar manner as performed by the human.

As a third example, in embodiments, an RPA module 23516 is configured to learn a workflow by recording a set of actions performed by a human to complete the workflow. For example, the RPA module 23516 can receive, from the user, an indication of a start of the workflow involving a device, such as a selection of a Start Recording button. The RPA module 23516 can receive user input from the user, such as input to one or more human interaction devices (HIDs) such as a keyboard, a mouse, a touchscreen, a camera, or a microphone. Alternatively or additionally, the RPA module 23516 can receive user input as a series of human interaction events reported by a device, such as an input layer of an operating system that receives and aggregates user input from one or more human input devices. Alternatively or additionally, the RPA module 23516 can receive user input as a series of events reported by one or more applications, such as a web browser that reports a set of user input events. The RPA module 23516 can record the user input as a sequence of inputs. The RPA module 23516 can associate the recorded user input with contextual information, such as an identification of the application to which the user input was directed. The RPA module 23516 can associate the recorded user input with other events, such as preceding events of an application that receives the user input (e.g., an indication by a web browser that a web page has been rendered and is available to receive user input) and/or responsive events of the application in response to receiving the user input (e.g., an action performed by a web page in response to receiving user input). The RPA module 23516 can associate the recorded user input with other events occurring within the device, such as an action performed by another application or an operating system of the device in response to the user input. The RPA module 23516 can receive, from the user, an indication of an end of the workflow, such as a selection of a Stop Recording button. The RPA module 23516 can generate a workflow that includes a record of the observed user input, optionally in association with other data. The RPA module 23516 can store the generated workflow for future use. For example, the RPA module 23516 can replay the sequence of recorded user input to perform the workflow in a similar manner as performed by the human.

As a fourth example, in embodiments, an RPA module 23516 is configured to learn a workflow by watching an interaction between a human and a device. For example, a human can perform a number of workflows using the device over a period of time, such as a business day. The RPA module 23516 can monitor the user input of the human and can identify, in the user input, one or more patterns of actions that are repeatedly performed by the human. The RPA module 23516 can determine that a pattern of actions corresponds to a workflow performed by the human. In some embodiments, the RPA module 23516 can identify variations among various instances of the actions when performed by the human during the workflow, such as different types of data entry that occur in different instances of the actions. The RPA module 23516 can associate an action in the workflow with one or more parameters, wherein the parameters correspond to the different variations among the various instances of the action when performed by the human. In various embodiments, the RPA module 23516 can determine a basis of each of the variations of the action that are associated with different variations of the action in the workflow. For example, the RPA module 23516 can determine that when the workflow is performed by the human on behalf of a first user, the action is to be performed with a first data entry value, such as data entry including the name of the first user. When the workflow is performed by the human on behalf of a second user, the action is to be performed with a second data entry value, such as data entry including the name of the second user. The data entry can be represented in the workflow as a data entry parameter (e.g., a name of a user on whose behalf the workflow is performed), optionally with specific values that correspond to a context of the workflow (e.g., the names of the users on whose behalf the workflow can be performed). The RPA module 23516 can generate a workflow that includes a sequence of commands that correspond to the pattern of actions performed by the user during the workflow, and, optionally, the parameters and/or parameter values of various actions of the workflow. The RPA module 23516 can store the generated workflow for future use. For example, the RPA module 23516 can replay the sequence of commands to replicate the pattern of actions that correspond to the workflow when performed in a similar manner as by the human.

In embodiments, the RPA module 23516 can be implemented in a variety of architectures. As a first example, the RPA module 23516 can be implemented on the same device as a human uses to perform a workflow, and/or that a user uses to specify the details of a workflow. The RPA module 23516 can store one or more generated workflows on the device, and can perform the workflow on the same device. As a second example, the RPA module 23516 can be implemented on a first device to replicate a workflow performed by a human on a second device. The RPA module 23516 can monitor the interaction of the human with the second device while performing a task, generate and store a workflow on the first device, and execute the workflow on the first device to perform the task on the first device in a similar manner as performed by the user on the second device. As a third example, the RPA module 23516 can be implemented on a first device to generate a workflow that corresponds to a task performed by the human on the first device, and can transmit the workflow to a second device. The workflow can cause the second device to perform the task on the second device in a similar manner as performed by the user on the first device. As a fourth example, the RPA module 23516 can be implemented on a second device to receive a workflow that corresponds to a task performed by the human on a first device. The RPA module 23516 workflow can execute the workflow on the second device to perform the task on the second device in a similar manner as performed by the user on the first device. In some embodiments, the RPA module 23516 can be distributed over a set of two or more devices, such as a first portion of the RPA module 23516 that executes on a first device to generate a workflow based on an interaction between a human and the first device, and a second portion of the RPA module 23516 that executes on a second device to perform the workflow on the second device. In some embodiments, at least a portion of the RPA module 23516 can be replicated over a plurality of devices, such as two or more devices that each perform (e.g., concurrently and/or consecutively) a workflow that was generated based on an interaction between a human and a first device. In some embodiments, different RPA modules 23516 executing on each of a plurality of devices can interact to execute one or more workflows (e.g., a first RPA module 23516 that executes on a first device to perform a first portion of a workflow, and a second RPA module 23516 that executes on a second device to perform a second portion of the same workflow). Each RPA module 23516 can operate in a particular role while performing at least a portion of a workflow, such as a first RPA module 23516 that executes on a cloud edge device to receive an input of a workflow, a second RPA module 23516 that executes on a cloud server to process the input of the workflow, and a third RPA module 23516 that executes on another cloud edge device to present an output of the workflow.

In embodiments, an RPA module 23516 can perform a workflow in response to a variety of triggers. The RPA module 23516 can perform a workflow in response to a request of a user, such as a request to execute code or run a particular script in order to perform a learned workflow. The RPA module 23516 can perform a workflow in response to a detection of a pattern of activity by a human (e.g., a second workflow that is to be performed by the RPA module 23516 in response to a completion of a first workflow by a human). The RPA module 23516 can perform at least a portion of a workflow in lieu of a human performing at least a portion of the workflow. For example, the RPA module 23516 can detect a start of a workflow by a human, and can suggest to the human that the RPA module 23516 perform the rest of the workflow. Upon receiving an acceptance of the suggestion, the RPA module 23516 can perform the entire workflow in lieu of the human, and/or one or more remaining steps of the workflow following the initial steps performed by the human. The RPA module 23516 can perform a workflow in response to an occurrence of a type of data (e.g., the device receiving a file that includes particular data type, such as a particular type of document or a particular type of image). The RPA module 23516 can perform a workflow in response to receiving a message through a communication channel such as email, telephone, text message, gesture input received by a camera or haptic input device, or voice input received by a microphone. The RPA module 23516 can perform a workflow in response to receiving a request from an operating system or an application executing on the device (e.g., a request from a spreadsheet application in response to a user entering a certain type of data). The RPA module 23516 can perform a workflow in response to a detected event. For example, when a device recognizes a presence of a particular human (e.g., when a camera of a device recognizes a face of the human), the RPA module 23516 can perform a workflow that involves displaying a report for the human. The RPA module 23516 can perform a workflow at a scheduled interval, such as once per hour or once per day. The RPA module 23516 can perform a workflow in response to a request received from another workflow executed on the same device or another device (e.g., a second workflow that is to be performed upon completion of a first workflow).

In embodiments, an RPA module 23516 can perform a workflow based on a variety of inputs. The RPA module 23516 can perform a workflow based on one or more details of a trigger of the workflow. For example, if the workflow is being performed in response to a request of a user to perform the workflow, the RPA module 23516 can perform the workflow based on one or more details of the request. For example, if the workflow was triggered by a request of a user to process a particular document, the RPA module 23516 can perform the workflow based on one or more details of the document. If the workflow is being performed in response to a message or telephone call, the RPA module 23516 can perform the workflow based on an identity of the sender of the message or the identity of the caller. If the workflow is being performed as a daily instance based on a schedule, the RPA module 23516 can perform the workflow based on the day of the week on which the workflow is being performed. If a workflow is being performed in response to a detection of a condition, the RPA module 23516 can perform the workflow based on one or more details of the condition. For example, if the condition is a storage capacity of a device that exceeds a storage capacity threshold, the RPA module 23516 can perform the workflow based on a severity of the storage capacity condition (e.g., a remaining storage capacity of the device). The RPA module 23516 can perform a workflow based on a data source, such as one or more files of a file system, one or more rows or records of a database, or one or more messages received by a network interface. If the RPA module 23516 is performing a workflow in response to one or more events, the RPA Module 23516 can perform the workflow based on one or more details of the event. For example, if the RPA module 23516 is performing a second workflow in response to a completion of a first workflow on the same device or another device, the RPA module 23516 can perform the workflow based on a date or time of the completion of the first workflow, a result of the first workflow, and/or an output of the first workflow. The RPA module 23516 can perform a workflow based on one or more contextual details. For example, the RPA module 23516 can perform a workflow based on a detected number and identities of humans who are present in the proximity of a device. The RPA module 23516 can perform a workflow based on data associated with an application executing on the device. For example, if the RPA module 23516 performs the workflow based on a loading of a web page, the RPA module 23516 can perform the workflow based on data scraped from the contents of the web page. The RPA module 23516 can perform the workflow based on observation of human actions that involve interactions with hardware elements, with software interfaces, and with other elements. Observations may include field observations as humans perform real tasks, as well as observations of simulations or other activities in which a human performs an action with the explicit intent to provide a training data set or input for the RPA module 23516, such as where a human tags or labels a training data set with features that assist the RPA module 23516 in learning to recognize or classify features or objects, among many other examples.

In embodiments, an RPA module 23516 can interact with one or more applications while performing the workflow. For example, the RPA module 23516 can extract data from a variable or an object of an application, such as text content of a textbox in a web form or the contents of cells in a spreadsheet. The RPA module 23516 can extract data stored within an application (e.g., by inspecting a memory space of the application). The RPA module 23516 can analyze data generated as output by the application (e.g., one or more files generated by the application, one or more rows or records of a spreadsheet generated by the application, or one or more network communication messages received and/or transmitted by the application over a network). The RPA module 23516 can invoke an application programming interface (API) of the application to request data from the application, and can receive and analyze data provided by the application in response to the invocation of the API. The RPA module 23516 can examine one or more properties of the device on which the application is executing (e.g., a portion of a display of the devices that includes a graphical user interface of the application) to extract data from the application. Alternatively or additionally, the RPA module 23516 can provide data to an application and/or modify a behavior of an application while performing the workflow. For example, the RPA module 23516 can generate user input that is directed to an application (e.g., simulating a human interaction device (HID), such as a keyboard, to generate keystrokes that are delivered to the application as user input). The RPA module 23516 can directly transmit and/or modify data of the application (e.g., altering HTML data stored in a rendered web page to modifying the contents of the textbox, or directly modifying data in the memory space of an application). The RPA module 23516 can request the operating system to interact with and/or modify the behavior of an application (e.g., requesting that the device start, activate, suspend, resume, close, or terminate an application). The RPA module 23516 can invoke an API of the application to provide data to the application (e.g., invoking an API of a spreadsheet to request the entry of data into a particular cell). The RPA module 23516 can invoke code associated with an application to provide data and/or modify the behavior of the application (e.g., executing code that is encoded in an application-specific programming language and embedded in a document used by an application or invoking a stored procedure of a database associated with the application). The RPA module 23516 can cause or allow an interaction with an application to be visible to a human (e.g., the RPA module 23516 can provide user input that simulates a user visually activating a spreadsheet application and visually typing data into various cells of the spreadsheet application). The RPA module 23516 can hide an interaction with an application from a human (e.g., visually hiding a window of an application while entering data into one or more textboxes of the window of the application).

In embodiments, an RPA module 23516 can utilize a variety of logical processes while performing a workflow. The RPA module 23516 can retrieve, interpret, analyze, convert, validate, aggregate, partition, render, store, and/or otherwise process data that was received and/or is associated with the workflow. The RPA module 23516 can transmit the data to another workflow, application, or device for processing or storage, and/or can query or receive the data from another workflow, application, or device. The RPA module 23516 can apply an optical character recognition (OCR) process to an image (e.g., a picture of a form or a document) to determine and extract text content from the image. The RPA module 23516 can apply a computer vision process to an image (e.g., a photograph captured by a camera) to determine and extract image data from the image, such as detecting, recognizing, classifying, and/or localizing one or more objects. The RPA module 23516 can apply a speech recognition process to a sound input (e.g., a voice input from a telephone call or a microphone) to determine and extract voice content from the image, such as one or more voice commands. The RPA module 23516 can apply a gesture recognition process to an input device (e.g., a camera, proximity sensor, or inertial measurement unit that detects movement of a hand) to determine one or more gestures performed by a human. The RPA module 23516 can apply a pattern recognition process to data to detect one or more patterns in the data (e.g., analyzing sensor data from a machine to detect one or more occurrences of an event associated with the machine, such as a movement of a moving part of the machine).

In embodiments, the RPA module 23516 performs a workflow in cooperation with a human or another workflow. For example, a workflow can include one or more human portions to be performed by a human and one or more automated portions to be performed by the RPA module 23516. The RPA module 23516 can first perform an automated portion and deliver a result of the automated portion to the human so that the human can perform a human portion based on the result. The RPA module 23516 can receive a result of a human portion of the workflow and can perform an automated portion of the workflow on the result of the human portion of the workflow. The RPA module 23516 can perform the automated portion of the workflow concurrently with a human performing a human portion of the workflow, and can then combine a result of the automated portion of the workflow with a result of the human portion of the workflow. The RPA module 23516 can perform a first automated portion of the workflow, present a result of the first automated portion to a human for review and validation, and can perform a second automated portion of the workflow based on the review and validation of the result of the first automated portion based on a result of the review and validation by the human.

In embodiments, an RPA module 23516 may learn to perform certain tasks based on the learned patterns and processes. The RPA module 23516 can use one or more artificial intelligence modules 23504 to perform one or more steps of a workflow. For example, an RPA module 23516 can perform a data classification step on input data by applying a classification neural network to the input data. An RPA module 23516 can perform a pattern recognition step on input data by applying a pattern recognition neural network to the input data. An RPA module 23516 can perform a computer vision processing step and/or an optical character recognition step of a workflow by applying one or CNNs 23560 to an image. An RPA module 23516 can perform a sequential analysis step involving time series data by applying one or more recurrent neural networks (RNNs) to the time series data. An RPA module 23516 can perform one or more natural language processing steps on a natural-language expression (e.g., a natural-language document or a natural-language voice input) by applying one or more transformer-based neural networks to the natural-language expression.

In various embodiments, the RPA module 23516 uses one or more artificial intelligence modules 23504 that are untrained. For example, the one or more artificial intelligence modules 23504 can include a k-nearest-neighbor model that determines a classification of a received input based on a proximity of the received input to a collection of other inputs with known classifications. The k-nearest-neighbor model then classifies the received input according to a majority of the known classifications of the determined k inputs that are closest to the received input.

In various embodiments, the RPA module 23516 uses one or more artificial intelligence modules 23504 that are trained in an unsupervised manner. For example, the workflow can include an anomaly detection step, such as determining a portion of a form that includes handwritten text. An anomaly detection algorithm can partition the form into a collection of symbols, and can compare the symbols to distinguish between symbols that occur with a high frequency (e.g., machine-printed characters in a font) from symbols that occur with a low frequency (e.g., hand-printed characters that are unique or at least highly variable). The anomaly detection algorithm can therefore partition the form into regions that include machine-printed characters and regions that include hand-printed characters. The RPA module 23516 can then process each region of the document with either an OCR module that is configured to recognize machine-printed characters in a font or an OCR module that is configured to recognize hand-printed characters.

In various embodiments, the RPA module 23516 uses one or more artificial intelligence modules 23504 that are specifically designed and/or trained for the workflow. For example, the workflow can be associated with a training data set, and the RPA module 23516 can train one or more machine learning models to perform the processing of the workflow based on the training data set. In various embodiments, the RPA module 23516 uses one or more pretrained artificial intelligence modules 23504 to perform the processing of the workflow. For example, the RPA module 23516 can receive a partially pretrained natural language processing (NLP) machine learning model that is generally trained to recognize sentence structure and word meaning. The RPA module 23516 can adapt the partially pretrained NLP machine learning model based on natural-language expressions that are more specifically associated with the workflow. The adaptation can involve applying transfer learning to an artificial intelligence module 23504 (e.g., more specifically training one or more classification layers in a classification portion of the NLP machine learning model while holding other portions of the NLP machine learning model constant). The adaptation can involve retraining an artificial intelligence module 23504 (e.g., retraining an entirety of an NLP machine learning model based on natural-language expressions that are associated with a workflow). The adaptation can involve generating an ensemble of artificial intelligence modules 23504 to perform the workflow (e.g., two or more artificial intelligence modules 23504, each of which performs classification of data in a different way, wherein an output classification of the workflow is based on a consensus of the two or more artificial intelligence modules 23504). The artificial intelligence modules 23504 can include a random forest, in which each of one or more decision trees analyses an input data according to different criteria, and an output of the random forest is based on a consensus of the decision trees. The artificial intelligence modules 23504 can include a stacking ensemble, in which each of two or more machine learning models processes data to generate an output, and another machine learning model determines which output, among the outputs of the two or more machine learning models, is to be used as the output of processing the data.

In embodiments, the RPA module 23516 generates one or more outputs or results of a workflow. The RPA module 23516 can generate, as output, data that can be stored by the device (e.g., as a file in a file system or as a row or record in a database). The RPA module 23516 can generate, as output, data that is included in another data set (e.g., text entered into fields of a form, numbers entered into cells of a spreadsheet, or text entered into textboxes of a web page). The RPA module 23516 can generate, as output, data that is transmitted to another device (e.g., a submission of form data of a web page to a webserver). The RPA module 23516 can generate, as output, data that is communicated to one or more users (e.g., a visual notification of a result displayed for a user of the device, or a message that is transmitted to a user by a communication channel such as email, text message, or voice output). The RPA module 23516 can generate, as output, data that modifies a behavior of an application (e.g., a command to start, activate, suspend, resume, close, or terminate an application). The RPA module 23516 can generate, as output, data that modifies a behavior of the device or another device (e.g., a command that controls a machine, such as a printer, a camera, a device, or an industrial manufacturing device). The RPA module 23516 can generate, as output, data that reflects an initial, current, or final status of the workflow (e.g., a dashboard that shows a progress of the workflow to completion, or a result of the workflow in combination with the results of other workflows). The RPA module 23516 can generate, as output, one or more events (e.g., notifications to a human, an application, an operating system of the device, or another device as to the progression, completion, and/or results of the workflow).

The events can be received and further processed by the RPA module 23516 or another RPA module executing on the same device or another device. For example, upon completion of a first workflow, the RPA module 23516 can initiate a second workflow based on a result and/or output of the first workflow. The RPA module 23516 can generate, as output, documentation of one or more results of the workflow. For example, the RPA module 23516 can update a log to document the results and/or output of the workflow, including one or more errors, exceptions, validation failures that occurred during the workflow.

In embodiments, the RPA module 23516 modifies a workflow based on a performance of the workflow. For example, the RPA module 23516 can request review, by a user, of one or more results of the workflow, including one or more errors, exceptions, validation failures that occurred during the workflow. The RPA module 23516 can deactivate one or more steps or modules of the workflow that resulted in an error, exception, or validation failure. The RPA module 23516 can automatically adjust the workflow to perform future instances of the workflow based on the completed instance of the workflow. For example, the RPA module 23516 can update the workflow to improve an efficiency of the workflow, to add or remove functions to the workflow, to adjust functions of the workflow to perform differently, to log one or more instances and/or parameters of the workflow, and/or to eliminate or reduce one or more logical faults in the workflow. The RPA module 23516 can update one or more artificial intelligence modules 23504 associated with the workflow. For example, the RPA module 23516 can generate or add one or more machine learning models to the workflow to improve processing of the workflow. The RPA module 23516 can remove one or more machine learning models to improve efficiency of the workflow. The RPA module 23516 can redesign and/or retrain one or more machine learning models based on a result of the workflow. The RPA module 23516 can add one or more machine learning models to an existing ensemble of machine learning models.

Analytics Module

In embodiments, the artificial intelligence modules 23504 may include and/or provide access to an analytics module 23518. In embodiments, an analytics module 23518 is configured to perform various analytical processes on data output from value chain entities or other data sources. In example embodiments, analytics produced by the analytics module 23518 may facilitate quantification of system performance as compared to a set of goals and/or metrics. The goals and/or metrics may be preconfigured, determined dynamically from operating results, and the like. Examples of analytics processes that can be performed by an analytics module 23518 are discussed below and in the document incorporated herein by reference. In some example implementations, analytics processes may include tracking goals and/or specific metrics that involve coordination of value chain activities and demand intelligence, such as involving forecasting demand for a set of relevant items by location and time (among many others).

Digital Twin Module

In embodiments, artificial intelligence modules 23504 may include and/or provide access to a digital twin module 23520. The digital twin module 23520 may encompass any of a wide range of features and capabilities described herein In embodiments, a digital twin module 23520 may be configured to provide, among other things, execution environments for and different types of digital twins, such as twins of physical environments, twins of robot operating units, logistics twins, executive digital twins, organizational digital twins, role-based digital twins, and the like. In embodiments, the digital twin module 23520 may be configured in accordance with digital twin systems and/or modules described elsewhere throughout the disclosure. In example embodiments, a digital twin module 23520 may be configured to generate digital twins that are requested by intelligence clients 23536. Further, the digital twin module 23520 may be configured with interfaces, such as APIs and the like for receiving information from external data sources. For instance, the digital twin module 23520 may receive real-time data from sensor systems of a machinery, vehicle, robot, or other device, and/or sensor systems of the physical environment in which a device operates. In embodiments, the digital twin module 23520 may receive digital twin data from other suitable data sources, such as third-party services (e.g., weather services, traffic data services, logistics systems and databases, and the like. In embodiments, the digital twin module 23520 may include digital twin data representing features, states, or the like of value chain network entities, such as supply chain infrastructure entities, transportation or logistic entities, containers, goods, or the like, as well as demand entities, such as customers, merchants, stores, points-of-sale, points-of-use, and the like. The digital twin module 23520 may be integrated with or into, link to, or otherwise interact with an interface (e.g., a control tower or dashboard), for coordination of supply and demand, including coordination of automation within supply chain activities and demand management activities.

In embodiments, a digital twin module 23520 may provide access to and manage a library of digital twins. Artificial intelligence modules 23504 may access the library to perform functions, such as a simulation of actions in a given environment in response to certain stimuli.

Machine Vision Module

In embodiments, artificial intelligence modules 23504 may include and/or provide access to a machine vision module 23522. In embodiments, a machine vision module 23522 is configured to process images (e.g., captured by a camera) to detect and classify objects in the image. In embodiments, the machine vision module 23522 receives one or more images (which may be frames of a video feed or single still shot images) and identifies "blobs" in an image (e.g., using edge detection techniques or the like). The machine vision module 23522 may then classify the blobs. In some embodiments, the machine vision module 23522 leverages one or more machine-learned image classification models and/or neural networks (e.g., convolutional neural networks) to classify the blobs in the image. In some embodiments, the machine vision module 23522 may perform feature extraction on the images and/or the respective blobs in the image prior to classification. In some embodiments, the machine vision module 23522 may leverage classification made in a previous image to affirm or update classification(s) from the previous image. For example, if an object that was detected in a previous frame was classified with a lower confidence score (e.g., the object was partially occluded or out of focus), the machine vision module 23522 may affirm or update the classification if the machine vision module 23522 is able to determine a classification of the object with a higher degree of confidence. In embodiments, the machine vision module 23522 is configured to detect occlusions, such as objects that may be occluded by another object. In embodiments, the machine vision module 23522 receives additional input to assist in image classification tasks, such as from a radar, a sonar, a digital twin of an environment (which may show locations of known objects), and/or the like. In some embodiments, a machine-vision module 23522 may include or interface with a liquid lens. In these embodiments, the liquid lens may facilitate improved machine vision (e.g., when focusing at multiple distances is necessitated by the environment and job of a robot) and/or other machine vision tasks that are enabled by a liquid lens.

Natural Language Processing Module

In embodiments, the artificial intelligence modules 23504 may include and/or provide access to a natural language processing (NLP) module 23524. In embodiments, an NLP module 23524 performs natural language tasks on behalf of an intelligence service client 23536. Examples of natural language processing techniques may include, but are not limited to, speech recognition, speech segmentation, speaker diarization, text-to-speech, lemmatization, morphological segmentation, parts-of-speech tagging, stemming, syntactic analysis, lexical analysis, and the like. In embodiments, the NLP module 23524 may enable voice commands that are received from a human. In embodiments, the NLP module 23524 receives an audio stream (e.g., from a microphone) and may perform voice-to-text conversion on the audio stream to obtain a transcription of the audio stream. The NLP module 23524 may process text (e.g., a transcription of the audio stream) to determine a meaning of the text using various NLP techniques (e.g., NLP models, neural networks, and/or the like). In embodiments, the NLP module 23524 may determine an action or command that was spoken in the audio stream based on the results of the NLP. In embodiments, the NLP module 23524 may output the results of the NLP to an intelligence service client 23536.

In embodiments, the NLP module 23524 provides an intelligence service client 23536 with the ability to parse one or more conversational voice instructions provided by a human user to perform one or more tasks as well as communicate with the human user. The NLP module 23524 may perform speech recognition to recognize the voice instructions, natural language understanding to parse and derive meaning from the instructions, and natural language generation to generate a voice response for the user upon processing of the user instructions. In some embodiments, the NLP module 23524 enables an intelligence service client 23536 to understand the instructions and, upon successful completion of the task by the intelligence service client 23536, provide a response to the user. In embodiments, the NLP module 23524 may formulate and ask questions to a user if the context of the user request is not completely clear. In embodiments, the NLP module 23524 may utilize inputs received from one or more sensors including vision sensors, location-based data (e.g., GPS data) to determine context information associated with processed speech or text data.

In embodiments, the NLP module 23524 uses neural networks when performing NLP tasks, such as recurrent neural networks, long short term memory (LSTMs), gated recurrent unit (GRUs), transformer neural networks, convolutional neural networks and/or the like.

FIG. 238 illustrates an example neural network 23500 for implementing NLP module 23524. In the illustrated example, the example neural network is a transformer neural network. In the example, the transformer neural network 23500 includes three input stages and five output stages to transform an input sequence into an output sequence. The example transformer includes an encoder 23502 and a decoder 23504. The encoder 23502 processes input, and the decoder 23504 generates output probabilities, for example. The encoder 23502 includes three stages, and the decoder 23504 includes five stages. Encoder 23502 stage 1 represents an input as a sequence of positional encodings added to embedded inputs. Encoder 23502 stages 2 and 3 include N layers (e.g., N=6, etc.) in which each layer includes a position-wise feedforward neural network (FNN) and an attention-based sublayer. Each attention-based sublayer of encoder 23502 stage 2 includes four linear projections and multi-head attention logic to be added and normalized to be provided to the position-wise FNN of encoder 23502 stage 3. Encoder 23502 stages 2 and 3 employ a residual connection followed by a normalization layer at their output.

The example decoder 23504 processes an output embedding as its input with the output embedding shifted right by one position to help ensure that a prediction for position i is dependent on positions previous to/less than i. In stage 2 of the decoder 23504, masked multi-head attention is modified to prevent positions from attending to subsequent positions. Stages 3-4 of the decoder 23504 include N layers (e.g., N=6, etc.) in which each layer includes a position-wise FNN and two attention-based sublayers. Each attention-based sublayer of decoder 23504 stage 3 includes four linear projections and multi-head attention logic to be added and normalized to be provided to the position-wise FNN of decoder 23504 stage 4. Decoder 23504 stages 2-4 employ a residual connection followed by a normalization layer at their output. Decoder 23504 stage 5 provides a linear transformation followed by a softmax function to normalize a resulting vector of K numbers into a probability distribution 23506 including K probabilities proportional to exponentials of the K input numbers.

Additional examples of neural networks may be found elsewhere in the disclosure.

Rules-Based Module

Referring back to FIG. 235, in embodiments, artificial intelligence modules 23504 may also include and/or provide access to a rules-based module 23528 that may be integrated into or be accessed by an intelligence service client 23536. In some embodiments, a rules-based module 23528 may be configured with programmatic logic that defines a set of rules and other conditions that trigger certain actions that may be performed in connection with an intelligence client. In embodiments, the rule-based module 23528 may be configured with programmatic logic that receives input and determines whether one or more rules are met based on the input. If a condition is met, the rules-based module 23528 determines an action to perform, which may be output to a requesting intelligence service client 23536. The data received by the rules-based engine may be received from an intelligence service input source 23532 and/or may be requested from another module in artificial intelligence modules 23504, such as the machine vision module 23522, the neural network module 23514, the ML module 23512, and/or the like. For example, a rule-based module 23528 may receive classifications of objects in a field of view of a mobile system (e.g., robot, autonomous vehicle, or the like) from a machine vision system and/or sensor data from a lidar sensor of the mobile system and, in response, may determine whether the mobile system should continue in its path, change its course, or stop. In embodiments, the rules-based module 23528 may be configured to make other suitable rules-based decisions on behalf of a respective client 23536, examples of which are discussed throughout the disclosure. In some embodiments, the rules-based engine may apply governance standards and/or analysis modules, which are described in greater detail below.

Intelligence Services Controller and Analysis Management Module

In embodiments, artificial intelligence modules 23504 interface with an intelligence service controller 23502, which is configured to determine a type of request issued by an intelligence service client 23536 and, in response, may determine a set of governance standards and/or analyses that are to be applied by the artificial intelligence modules 23504 when responding to the request. In embodiments, the intelligence service controller 23502 may include an analysis management module 23506, a set of analysis modules 23508, and a governance library 23510.

In embodiments, an intelligence service controller 23502 is configured to determine a type of request issued by an intelligence service client 23536 and, in response, may determine a set of governance standards and/or analyses that are to be applied by the artificial intelligence modules 23504 when responding to the request. In embodiments, the intelligence service controller 23502 may include an analysis management module 23506, a set of analysis modules 23508, and a governance library 23510. In embodiments, the analysis management module 23506 receives an artificial intelligence module 23504 request and determines the governance standards and/or analyses implicated by the request. In embodiments, the analysis management module 23506 may determine the governance standards that apply to the request based on the type of decision that was requested and/or whether certain analyses are to be performed with respect to the requested decision. For example, a request for a control decision that results in an intelligence service client 23536 performing an action may implicate a certain set of governance standards that apply, such as safety standards, legal standards, quality standards, or the like, and/or may implicate one or more analyses regarding the control decision, such as a risk analysis, a safety analysis, an engineering analysis, or the like.

In some embodiments, the analysis management module 23506 may determine the governance standards that apply to a decision request based on one or more conditions. Non-limiting examples of such conditions may include the type of decision that is requested, a geolocation in which a decision is being made, an environment that the decision will affect, current or predicted environment conditions of the environment and/or the like. In embodiments, the governance standards may be defined as a set of standards libraries stored in a governance library 23510. In embodiments, standards libraries may define conditions, thresholds, rules, recommendations, or other suitable parameters by which a decision may be analyzed. Examples of standards libraries may include, legal standards library, a regulatory standards library, a quality standards library, an engineering standards library, a safety standards library, a financial standards library, and/or other suitable types of standards libraries. In embodiments, the governance library 23510 may include an index that indexes certain standards defined in the respective standards library based on different conditions. Examples of conditions may be a jurisdiction or geographic areas to which certain standards apply, environmental conditions to which certain standards apply, device types to which certain standards apply, materials or products to which certain standards apply, and/or the like.

In some embodiments, the analysis management module 23506 may determine the appropriate set of standards that must be applied with respect to a particular decision and may provide the appropriate set of standards to the artificial intelligence modules 23504, such that the artificial intelligence modules 23504 leverages the implicated governance standards when determining a decision. In these embodiments, the artificial intelligence modules 23504 may be configured to apply the standards in the decision-making process, such that a decision output by the artificial intelligence modules 23504 is consistent with the implicated governance standards. It is appreciated that the standards libraries in the governance library may be defined by the platform provider, customers, and/or third parties. The standards may be government standards, industry standards, customer standards, or other suitable sources. In embodiments, each set of standards may include a set of conditions that implicate the respective set of standards, such that the conditions may be used to determine which standards to apply given a situation.

In some embodiments, the analysis management module 23506 may determine one or more analyses that are to be performed with respect to a particular decision and may provide corresponding analysis modules 23508 that perform those analyses to the artificial intelligence modules 23504, such that the artificial intelligence modules 23504 leverage the corresponding analysis modules 23508 to analyze a decision before outputting the decision to the requesting client. In embodiments, the analysis modules 23508 may include modules that are configured to perform specific analyses with respect to certain types of decisions, whereby the respective modules are executed by a processing system that hosts the instance of the intelligence services 23500. Non-limiting examples of analysis modules 23508 may include risk analysis module(s), security analysis module(s), decision tree analysis module(s), ethics analysis module(s), failure mode and effects (FMEA) analysis module(s), hazard analysis module(s), quality analysis module(s), safety analysis module(s), regulatory analysis module(s), legal analysis module(s), and/or other suitable analysis modules.

In some embodiments, the analysis management module 23506 is configured to determine which types of analyses to perform based on the type of decision that was requested by an intelligence service client 23536. In some of these embodiments, the analysis management module 23506 may include an index or other suitable mechanism that identifies a set of analysis modules 23508 based on a requested decision type. In these embodiments, the analysis management module 23506 may receive the decision type and may determine a set of analysis modules 23508 that are to be executed based on the decision type. Additionally or alternatively, one or more governance standards may define when a particular analysis is to be performed. For example, the engineering standards may define what scenarios necessitate a FMEA analysis. In this example, the engineering standards may have been implicated by a request for a particular type of decision and the engineering standards may define scenarios when an FMEA analysis is to be performed. In this example, artificial intelligence modules 23504 may execute a safety analysis module and/or a risk analysis module and may determine an alternative decision if the action would violate a legal standard or a safety standard. In response to analyzing a proposed decision, artificial intelligence modules 23504 may selectively output the proposed condition based on the results of the executed analyses. If a decision is allowed, artificial intelligence modules 23504 may output the decision to the requesting intelligence service client 23536. If the proposed configuration is flagged by one or more of the analyses, artificial intelligence modules 23504 may determine an alternative decision and execute the analyses with respect to the alternate proposed decision until a conforming decision is obtained.

It is noted here that in some embodiments, one or more analysis modules 23508 may themselves be defined in a standard, and one or more relevant standards used together may comprise a particular analysis. For example, the applicable safety standard may call for a risk analysis that can use or more allowable methods. In this example, an ISO standard for overall process and documentation, and an ASTM standard for a narrowly defined procedure may be employed to complete the risk analysis required by the safety governance standard.

As mentioned, the foregoing framework of an intelligence services 23500 may be applied in and/or leveraged by various entities of a value chain. For example, in some embodiments, a platform-level intelligence system may be configured with the entire capabilities of the intelligence services 23500, and certain configurations of the intelligence services 23500 may be provisioned for respective value chain entities. Furthermore, in some embodiments, an intelligence service client 23536 may be configured to escalate an intelligence system task to a higher-level value chain entity (e.g., edge-level or the platform-level) when the intelligence service client 23536 cannot perform the task autonomously. It is noted that in some embodiments, an intelligence service controller 23502 may direct intelligence tasks to a lower-level component. Furthermore, in some implementations, an intelligence services 23500 may be configured to output default actions when a decision cannot be reached by the intelligence services 23500 and/or a higher or lower-level intelligence system. In some of these implementations, the default decisions may be defined in a rule and/or in a standards library.

Reinforcement Learning to Determine Optimal Policy

Reinforcement learning (RL), is a machine learning technique where an agent iteratively learns optimal policy through interactions with the environment. In RL, the agent must discover correct actions by trial-and-error so as to maximize some notion of long-term reward. Specifically, in a system employing RL, there exist two entities: (1) an environment and (2) an agent. The agent is a computer program component that is connected to its environment such that it can sense the state of the environment as well as execute actions on the environment. On each step of interaction, the agent senses the current state of the environment, s, and chooses an action to take, a. The action changes the state of the environment, and the value of this state transition is communicated to the agent by a reward signal, r, where the magnitude of r indicates the desirability of an action. Over time, the agent builds a policy, x, which specifies the action the agent will take for each state of the environment.

Formally, in reinforcement learning, there exists a discrete set of environment states, S; a discrete set of agent actions, A; and a set of scalar reinforcement signals, R. After learning, the system creates a policy, π, that defines the value of taking action a∈A in state s∈S. The policy defines Qπ(s, a) as the expected return value for starting from s, taking action a, and following policy π.

The reinforcement learning agent is trained in a policy through iterative exposure to various states, having the agent select an action as per the policy and providing a reward based on a function designed to reward desirable behavior. Based on the reward feedback, the system may "learn" the policy and becomes trained in producing desirable actions. For example, for navigation policy, RL agent may evaluate its state repeatedly (e.g., location, distance from a target object), select an action (e.g., provide input to the motors for movement towards the target object), evaluate the action using a reward signal, which provides an indication of the of the success of the action. (e.g., a reward of +10 if movement reduces the distance between a mobile system and a target object and −10 if the movement increases the distance). Similarly, the RL agent may be trained in grasping policy by iteratively obtaining images of a target object to be grasped, attempt to grasp the object, evaluate the attempt, and then execute the subsequent iteration using the evaluation of the attempt of the preceding iteration(s) to assist in determining the next attempt.

There may be several approaches for training the RL agent in a policy. Imitation learning is a key approach in which the agent learns from state/action pairs where the actions are those that would be chosen by an expert (e.g., a human) in response to an observed state. Imitation learning not just solves sample-inefficiency or computational feasibility problems, but also makes the training process safer. The RL agent may derive multiple examples of the state/action pairs by observing a human (e.g., navigating towards and grasping a target object), and uses them as a basis for training the policy. Behavior cloning (BC), that focuses on learning the expert's policy using supervised learning is an example of imitation learning approach.

Value based learning approach aims to find a policy comprising a sequence of actions that maximizes the expectation value of future reward (or minimizes the expected cost). The RL agent may learn the value/cost function and then derives a policy with respect to the same. Two different expectation values are often referred to: the state value V(s) and the action value Q (s,a) respectively. The state value function V(s) represents the value associated with the agent at each state whereas the action value function Q(s,a) represents the value associated with the agent at state s and performing action a. The value-based learning approach works by approximating optimal value (V* or Q*) and then deriving an optimal policy. For example, the optimal value function Q*(s, a) may be identified by finding the sequence of actions which maximize the state-action value function Q (s, a). The optimal policy for each state can be derived by identifying the highest valued action that can be taken from each state.

$$\pi^*(s)=\text{argmax } Q^*(s,a)$$

To iteratively calculate the value function as actions within the sequence are executed and the mobile system transitions from one state to another, the Bellman Optimality equation may be applied. The optimal value function Q*(s,a) obeys Bellman Optimality equation and can be expressed as:

$$Q^*(s_t,a_t)=E[r_{t+1}+\gamma\max Q^*(s_{t+1},a_{t+1})]$$

Policy based learning approach directly optimizes the policy function π using a suitable optimization technique (e.g., stochastic gradient descent) to fine tune a vector of parameters without calculating a value function. The policy-based learning approach is typically effective in high-dimensional or continuous action spaces.

FIG. 239 illustrates an approach based on reinforcement learning and including evaluation of various states, actions and rewards in determining optimal policy for executing one or more tasks by a mobile system.

At 23602, a reinforcement learning agent (e.g., of the intelligence services system 23600) receives sensor information including a plurality of images captured by the mobile system in the environment. The analysis of one or more of these images may enable the agent to determine a first state associated with the mobile system at 23604. The data representing the first state may include information about the environment, such as images, sounds, temperature or time and information about the mobile system, including its position, speed, internal state (e.g., battery life, clock setting) etc.

At 23606, 23608, and 23610, various potential actions responsive to the state may be determined. Some examples of potential actions include providing control instructions to actuators, motors, wheels, wings flaps, or other components that controls the agent's speed, acceleration, orientation, or position; changing the agent's internal settings, such as putting certain components into a sleep mode to conserve battery life; changing the direction if the agent is in danger of colliding with an obstacle object; acquiring or transmitting data; attempting to grasp a target object and the like.

At 23612, 23614 and 23616, expected rewards may be determined for each of the potential actions based on a reward function. For each of the determined potential actions, an expected reward may be determined based on a reward function. The reward may be predicated on a desired outcome, such as avoiding an obstacle, conserving power, or acquiring data. If the action yields the desired outcome (e.g., avoiding the obstacle), the reward is high; otherwise, the reward may be low.

The agent may also look to the future to analyze whether there may be opportunities for realizing higher rewards in the future. At 23618, 23620, and 23622, the agent may determine future states resulting from potential actions respectively at 23606, 23608, and 23610.

For each of the future states predicted at 23618, 23620, and 23622, one or more future actions may be determined and evaluated. At steps 23624, 23626, and 23628, for example, values or other indicators of expected rewards associated with one or more of the future actions may be developed. The expected rewards associated with the one or more future actions may be evaluated by comparing values of reward functions associated with each future action At 23630, an action may be selected based on a comparison of expected current and future rewards.

In embodiments, the reinforcement learning agent may be pre-trained through simulations in a digital twin system. In embodiments, the reinforcement agent may be pre-trained using behavior cloning. In embodiments, the reinforcement agent may be trained using a deep reinforcement learning algorithm selected from Deep Q-Network (DQN), double deep Q-Network (DDQN), Deep Deterministic Policy Gradient (DDPG), soft actor critic (SAC), advantage actor critic (A2C), asynchronous advantage actor critic (A3C), proximal policy optimization (PPO), trust region policy optimization (TRPO).

In embodiments, the reinforcement learning agent may look to balance exploitation (of current knowledge) with exploration (of uncharted territory) while traversing the action space. For example, the agent may follow an ε-greedy policy by randomly selecting exploration occasionally with probability ε while taking the optimal action most of the time with probability $1-\varepsilon$, where ε is a parameter satisfying $0<\varepsilon<1$.

Market Orchestration Architecture

Referring to FIG. 240, a block diagram of exemplary features, capabilities, and interfaces of an exemplary deployment environment 24100 of a set of cross market interaction and exchange methods and systems 24110 is depicted. Cross market interaction and exchange methods and systems may be configured as a portion (or portions) of one or more transaction platforms. The exemplary embodiment in FIG. 240 depicts a cross market interaction and exchange method and system 24110 including currency-based value normalization, cross-exchange item value translation, item token generation, rights token generation and the like. Exemplary embodiments of cross market interaction and exchange methods and systems 24110 are depicted and described elsewhere herein. Assets (e.g., items) 24102 may represent one or more sources of asset information, such as item value, item characteristics, item rights, item smart contracts, and the like. In an exemplary transaction platform deployment of the cross market interaction and exchange methods and systems 24110, which is described elsewhere herein in greater detail, asset data may be processed, such as through use of robotic process automation (R P A) 24104, to generate, for example a normalized asset value, a translated asset value, an asset token, an asset right token, and the like.

In embodiments, cross market interaction and exchange methods and systems 24110 may be configured with or operationally connected to a set of application programming interfaces (APIs) through which, among other things, asset data may be retrieved and/or received. In exemplary embodiments, an API may be an open/standardized API (e.g., banking/financial institution open APIs) that, among other things, may facilitate integration with and into current and emerging ecosystems. Use of open/standardized APIs, while optional, may further enable cross market interaction and exchange methods and systems 24110 to be integrated into a wide range of transaction workflows, such as corporate internal workflows, inter-jurisdiction transaction workflows, and the like.

In example embodiments, market orchestration elements 24108 may facilitate use of cross market interaction and exchange methods and systems 24110 for various aspects of market orchestration, including, without limitations, software orchestrated transactions, software orchestrated marketplaces, and the like. Market orchestration elements 24108 may facilitate deployment of cross market interaction and exchange methods and systems 24110, such as in a web service embodiment, as an integrated function of a market orchestration platform, such as an automated market orchestration system of systems as described herein. In embodiments, cross market interaction and exchange methods and systems 24110 may provide cross market interaction and exchange capabilities for market orchestration when configured as a portion of market orchestration elements 24108 and the like.

The example deployment environment 24100 may include, reference and/or provide cross market interaction capabilities 24110 that may enable leveraging cross market interaction and exchange principals, computation capabilities, storage and data sourcing capabilities, as well as intelligence capabilities for cross market interactions. Cross market interaction capabilities 24110 may include interfaces to one or more marketplaces, transaction environments, and the like, so that, among other things, a data network and infrastructure pipeline 24106 may be configured with assets from one market in a cross market integration deployment as a source of data and with another market in the cross market integration deployment as a target recipient of the data network and infrastructure pipeline services. In embodiments, a similar arrangement may be constructed between two or more markets so that asset data in either market can be used as a data source and can be influenced by asset data from another market. Cross market interactions 24110 may be accomplished through one or more market-to-market data network and infrastructure pipelines for intelligent exchange of asset data among markets, such as data about assets of buyers in one market and about assets of sellers in another.

In the exemplary deployment environment 24100, functions and processes 24112, for an exemplary market-oriented deployment may include software oriented transaction functions and processes, automatic transaction transactions and processes, and the like. Functions and processes 24112 for cross market interaction and exchange methods and systems 24110 may include signaling availability of data (e.g., emergence of an occurrence of asset data) that impacts data provided to a transaction operator from (for example). Other exemplary functions and processes 24112 may include embedding cross market interaction and exchange capabilities into smart contracts, tokens, publishing data on a schedule, or other occurrences (e.g., an initiation of a smart contract and the like). Yet other functions and processes may include payments between/among machines and the like.

In embodiments, cross market interaction and exchange methods and systems may include and/or be associated with cross market interaction and exchange technology enablers 24114, such as 5G networking, artificial intelligence, visualization technology (e.g., VR/AR/XR), distributed ledger, and the like.

In embodiments, cross market interaction and exchange methods and systems 24110 may include and/or leverage cloud-based virtualized containerization capabilities and services 24116, such as without limitation a container deployment and operation controller, such as Kubernetes 24118 and the like. Cloud-based virtualized containers may facilitate cross market interaction and exchange resources being deployed close to asset data, thereby potentially reducing network bandwidth consumption or the potential for network disturbances in a data workflow and without substantive investment in infrastructure by an operator and/or consumer.

The exemplary deployment 24100 may further include business system interfaces 24120, such as APIs and the like that facilitate adoption of cross market interaction and exchange methods and systems by enterprises for development, among other things of a data-centric business workflow environment that enables cross-functional data use, seamless aggregation, and immediate contextualization of corporate data for individual departments, enterprise, subsidiary, and the like. Further integration of aspects of the cross market interaction and exchange methods and systems into enterprise systems may include integration with one or more enterprise databases and the like.

Cross market interaction and exchange enabled markets 24122 may be enabled by and/or enhanced through the adoption of cross market interaction and exchange technology. Markets, such as markets at an intersection of financial service and physical product offerings may be revealed and/or enabled through application of this technology to help parse, analyze, and provide intelligence for a wide range of market-impacting and/or related assets. These emergent markets may be substantively constructed as a result of application of cross market interaction and exchange techniques within or in association with individual markets, and the like.

Technologies that may be provided by and/or enabled by cross market interaction and exchange methods and systems 24110 may include intelligence services 24124, such as artificial intelligence, machine learning and the like. These intelligence services 24124 may be provided in the environment 24100, or accessed (e.g., as third-party services) via one or more interfaces of the environment 24100. The cross market interaction and exchange methods and systems may be provided access to these intelligence services 24124. One or more cross market interaction and exchange methods and systems 24110 may bring to the platform its own set of intelligence services, which may be dedicated to a host cross market interaction and exchange system, or may be shareable among linked systems, for example.

In the exemplary embodiment of FIG. 240, transaction/market oriented capabilities, services, and deployment may include market platforms 24126, transaction flows 24128, buyers 24132, sellers 24131, and transaction/marketplace specific data network and infrastructure pipelines that enrich transactions, transaction services and the like 24130. For multi-party transaction environments, a plurality of cross market interaction and exchange methods and systems 24110 may be configured and operated to satisfy a range of consumer needs for market analysis, transaction efficiencies, cost containment, buy/sell decisions and the like.

Normalization within a Set of Items

Referring to FIG. 241, computer-implemented methods and systems for automated orchestration of one or more marketplaces may include a set of robotic process automation services that are configured to state the value of a set of items that are represented in a plurality of exchanges, such that representation of the value of each member of the set of items in the plurality of exchanges is normalized based on the native currencies of the respective exchanges. A robotic process automation-enabled platform for item value normalization 24200 as depicted in FIG. 241 may receive information for a plurality of items 24202 that may be available for transaction in a plurality of exchanges. The plurality of items may include sets of items. Items within a set may be available for transaction in one or more of the plurality of exchanges. Each set of items may be available for transactions in one more of the plurality of exchanges as a set, such as a complete set (all items in a set), a partial set (a subset of items from the set), a hybrid set (combinations of items from two or more sets), and the like. Transactions of the one or more sets (and/or items in a set) may be bound by aspects of exchanges in which a transaction occurs. In an example, two exchanges may conduct transactions in two distinct currencies. While jurisdiction-specific currencies are contemplated, different currencies within and/or across jurisdictions are also contemplated, such as various types of cryptocurrencies, conventional currencies, and the like. As an example, a first exchange may value items in a currency, such as USD. Transactions for items in the first exchange may occur using USD. In addition to item values being based on an exchange-specific currency, fees (optional and/or mandatory) of an exchange (e.g., any of a range of fees that an exchange may charge in association with a transaction, some of which are described herein) may be based on the exchange-specific currency. In example embodiments, exchange fees may be based on an item value (e.g., a sales fee of x % of a transaction amount is charged to a transaction participant of the transaction). A second exchange (optionally within the jurisdiction of the first exchange) may value items in a virtual currency, such as a form of cryptocurrency and the like. Items, services, transaction fees, and the like may also be based on one or more cryptocurrencies of the second exchange.

A transaction orchestration platform, such as a may be described herein may include capabilities for orchestrating transactions, such as analysis, prediction, contracting services, and the like. Fees for these possibly optional services may also be aligned with an exchange-specific currency.

Transaction participants (e.g., item buyers and sellers and the like), exchange operators, transaction orchestrators, and other transaction facilitators may benefit from normalizing item values for sets of items that may be transacted through exchanges with distinct currencies. While cross-currency exchange rates may help participants determine some costs for exchanges with different currencies, normalizing item values may allow participants in a plurality of exchange-currency specific exchanges to determine aspects of item value, such as relative values and the like. Examples of a form of item value normalization across a plurality of exchanges is depicted in FIG. 241. The item value normalization platform 24200 may process item values for a plurality of sets of items 24202 to deliver a normalized value for items within the set. The item value normalization platform 24200 may deliver a normalized value for items within the set that are further normalized for a plurality of currencies of the exchanges. In an example, value of items in a first set of items maybe normalized within the set for a plurality of exchange currencies, such as normalized values of items of SET A may be normalized for a currency of exchange X 24204 and for a currency of exchange Y 24206. A range of normalization approaches may be applied. An exemplary approach involves normalizing values for items in a set against one of the items in the set (e.g., a reference item), so that a value of each item is represented relative to reference item value. Item value normalization within a set may further include normalization for item value for a given currency. In an example, values of items in the SET A may be based on a first currency (a reference currency). The normalized value of items in SET A for the reference currency may be processed by the platform 24200 for a second currency (e.g., exchange Y currency) to produce normalized values of items in SET A against the reference item for exchange Y currency.

An item normalization system 24208 may process item values (e.g., reference item values and the like) for a plurality of currencies; thereby producing a plurality of currency-specific normalized item values for items in a set against a reference item value. In the example of the embodiments depicted by FIG. 241, a plurality of sets of items 24202 (e.g., item set A represented by items A1, A2, and A3, item set B represented by items B1, B2, and B3, and item set C represented by items C1, C2, and C3) may be processed by the item in a set normalization for a currency system 24208. Representative items in one or more of the exemplary plurality of sets of items (Sets A, B, and C) may be processed for normalization of values within a set, thereby producing, for example, a plurality of item value normalized currency-specific item sets. In the embodiments of FIG. 241, exemplary sets A, B, and C may be processed for normalization for exchange X currency 24204 to produce item sets (item value sets) AX, BX, and CX 24212. Likewise, exemplary item sets A, B, and C may be processed for normalization within exchange Y currency 24206 to product items sets AY, BY, and CY 24214.

Normalization of item values within an item set, and optionally within a plurality of item sets, may include identifying one of the items in each set to be normalized as a reference item. In example embodiments, item A1 may be identified as a reference item for item value normalization of items within item set A. Item B2 may be selected for set B, and so forth so that at least one item is selected as a reference item for item value normalization in each set of items to be processed for item value normalization.

Determination of a reference item in a set (or a plurality of item sets) may be based on factors, such as item value in a given currency (e.g., the lowest valued item in the given currency). A reference item determination factor may include an item transaction history. Items with measurable transaction history may be valued based on marketplace factors, such as an exchange participant's perception of item value. Therefore, use of item transaction history may provide a value basis that may align well with a likely exchange value for the item, which may suggest exchange value for other items in the set. A reference item determination factor may include a degree of commonality of an item to other items in a set. As an example, if an item shares features, physical aspects, capabilities, and the like with a majority of other items in a set, designating it as a reference item may facilitate determining relative values for other items in the set based on, for example, differences, such as more or few features than such a reference item. Yet another reference item determination factor may be a degree of interest in the item, such as by exchange participants or by other measures (e.g., social media expressed interest and the like). Selecting a popular item as a reference item may enable value normalization of other, potentially less popular items in a set.

Further, an item selected as a reference item in a first set for a first currency may be different than an item selected as a reference item in the first set for a second currency. In an example, due at least in part to currency exchange rates, an item in a first currency with a value that is below a minimum monetary unit in a second currency may be preferred as a reference item in the first currency but not for the second currency, due at least in part to avoiding fractional valued items as reference items. Likewise, an item selected as a reference item for an item set in a first exchange may be different than an item selected as a reference item in the item set in a second exchange. Exchange factors that may impact selection of a reference item may include regional/jurisdictional differences, exchange participant preferences and the like.

The example embodiments depicted in FIG. 241 may include automation of item value normalization actions, such as those described herein as being performed by and/or enabled by the item normalization system 24208 and the like. Automation may be provided by and/or enabled by robotic process automation techniques as may be performed by a robotic process automation system 24210. The robotic process automation system 24210 may include capabilities, features, structures, methods, algorithms, techniques for learning, human activity emulation, and the like that may be similar to other robotic process automation systems described herein. In the embodiments of FIG. 241, the robotic process automation system 24210 may preform normalization of values of items in a plurality of sets of items, including, for example, selection of a reference item in an item set, normalization of values of other items in the item set, selection of a reference item in a plurality of item sets, normalization of values of other items in the plurality of items sets, and the like. As an example, normalization of items B1, B2, and B3 of item set B (in the plurality of item sets 24202) for exchange currency Y 24206 may be performed through application of automation capabilities of the robotic process automation system 24210, optionally without human intervention. In example embodiments, the robotic process automation system 24210 may autonomously perform item value normalization for one or more items in a set of items for one or more currencies, such as currencies associated with one or more exchanges (e.g., exchange X currency 24204 and/or exchange Y currency 24206).

Normalization Across Sets of Items

Referring to FIG. 242, computer-implemented methods and systems for automated orchestration of one or more marketplaces may include a set of robotic process automation services that are configured to state the value of a set of items that are represented in a plurality of exchanges, such that representation of the value of each member of the set of items in the plurality of exchanges is normalized based on the native currencies of the respective exchanges. A robotic process automation-enabled platform for item value normalization 24300 as depicted in FIG. 242 may receive information for a plurality of items 24302 that may be available for transaction in a plurality of exchanges. The plurality of items may include sets of items. Items within a set may be available for transaction in one or more of the plurality of exchanges. Each set of items may be available for transactions in one more of the plurality of exchanges as a set, such as a complete set (all items in a set), a partial set (a subset of items from the set), a hybrid set (combinations of items from two or more sets), and the like. Transactions of the one or more sets (and/or items in a set) may be bound by aspects of exchanges in which a transaction occurs. In an example, two exchanges may conduct transactions in two distinct currencies. While jurisdiction-specific currencies are contemplated, different currencies within and/or across jurisdictions are also contemplated, such as various types of cryptocurrencies, conventional currencies, and the like. As an example, a first exchange may value items in a currency, such as USD. Transactions for items in the first exchange may occur using USD. In addition to item values being based on an exchange-specific currency, fees (optional and/or mandatory) of an exchange (e.g., any of a range of fees that an exchange may charge in association with a transaction, some of which are described herein) may be based on the exchange-specific currency. In example embodiments, exchange fees may be based on an item value (e.g., a sales fee of x % of a transaction amount is charged to a transaction participant of the transaction). A second exchange (optionally within the jurisdiction of the first exchange) may value items in a virtual currency, such as a form of cryptocurrency and the like. Items, services, transaction fees, and the like may also be based on one or more cryptocurrencies of the second exchange.

Transaction participants (e.g., item buyers and sellers and the like), exchange operators, transaction orchestrators, and other transaction facilitators may benefit from normalizing item values for sets of items that may be transacted through exchanges with distinct currencies. While cross-currency exchange rates may help participants determine some costs for exchanges with different currencies, normalizing item values may allow participants in a plurality of exchange-currency specific exchanges to determine aspects of item value, such as relative values and the like. Examples of a form of item value normalization across a plurality of exchanges is depicted in FIG. 242. The item value normalization platform 24300 may process item values for a plurality of item sets 24302 to deliver a normalized value for items across the plurality of item sets. The item value normalization platform 24300 may deliver a normalized value for items across the plurality of item sets that are further normalized for a plurality of currencies of exchanges for which item value normalization is requested. In an example, value of items in a first set of items maybe normalized across a plurality of item sets for a plurality of exchange currencies, such as normalized values of items across SETs A, B, and C may be normalized for a currency of exchange X 24304 and for a currency of exchange Y 24306. A range of normalization approaches may be applied for both cross-set item value normalization for a single currency as well as for cross-set item value normalization for multiple currencies. An exemplary approach involves normalizing values for items in a first set against one or more of items in a second set (e.g., a reference set), so that a value of each item in the first set is represented relative to the one or more items in the reference set. Item value normalization across item sets may further include normalization for item value for a given currency. In an example, values of items in the SET A may be based on a first currency (a reference currency). The normalized value of items in SET A for the reference currency may be processed by the platform 24300 for a second currency (e.g., exchange Y currency) to produce normalized values of SET A items against the reference set for exchange Y currency.

An item normalization system 24308 may process item values (e.g., reference set item values and the like) for a plurality of currencies; thereby producing a plurality of currency-specific normalized item values for items in a set against a reference set. In the example of the embodiments depicted by FIG. 242, a plurality of sets of items 24302 (e.g., item set A represented by items A1, A2, and A3, item set B represented by items B1, B2, and B3, and item set C represented by items C1, C2, and C3) may be processed by cross-set item value normalization system 24308. Representative items in one or more of the exemplary plurality of sets of items (Sets A, B, and C) may be processed for normalization of values across the item sets, thereby producing, for example, a plurality of item value normalized currency-specific item sets. In the embodiments of FIG. 242, exemplary sets A, B, and C may be processed for normalization for exchange X currency 24304 to produce item sets (item value sets) AX, BX, and CX 24312. In this example, values of items in sets B and C are normalized for currency X against values of items in reference set A. Likewise, exemplary item sets A, B, and C may be processed for normalization within exchange Y currency 24306 to product items sets AY, BY, and CY 24314. In this example, values of items in sets A and C are normalized, for currency Y against values of items in reference set B.

Normalization of item values across item sets may include identifying one of the item sets in the plurality of item sets to be normalized as a reference item set. In example embodiments, one or more items in item set A, including any or all of the items in item set A, may be identified as a member of a reference set for item value normalization of items across a plurality of sets. Items in set B may alternatively be selected as items in a reference, and so forth.

Determination of a reference set may be based on factors, such as item values for a set in a given currency (e.g., the lowest valued set in the given currency). A reference set determination factor may include an item set transaction history. Item sets with a measurable transaction history may be valued based on marketplace factors, such as an exchange participant's perception of item set value. Therefore, use of item set transaction history may provide a value basis that may align well with a likely exchange value for item set, which may suggest an exchange value for other item sets in the plurality of item sets. A reference set determination factor may include a degree of commonality of a items in a set to items in other sets. As an example, if items in a first set share features, physical aspects, capabilities, and the like with a majority of other items in other item sets, designating the first set as a reference set may facilitate determining relative values for other items in other sets based on, for example, differences, such as more or few features than items in the reference set. Yet another reference set determination factor may be a degree of interest in one or more of the items in the set (and/or the set as a whole), such as by exchange participants or by other measures (e.g., social media expressed interest and the like). Selecting a popular item set as a reference set may enable value normalization of other, potentially less popular item sets.

Further, an item set selected as a reference set for a first currency may be different than a set selected as a reference set for a second currency. In an example, due at least in part to currency exchange rates, an item set in a first currency with a value that is below a minimum monetary unit in a second currency may be preferred as a reference set in the first currency but not for the second currency, due at least in part to avoiding fractional valued item sets as reference sets. Likewise, an item set selected as a reference set in a first exchange may be different than an item set selected as a reference set in a second exchange. Exchange factors that may impact selection of a reference set may include regional/jurisdictional differences, exchange participant preferences and the like.

The example embodiments depicted in FIG. 242 may include automation of item value normalization actions, such as those described herein as being performed by and/or enabled by the item normalization system 24308 and the like. Automation may be provided by and/or enabled by robotic process automation techniques as may be performed by a robotic process automation system 24310. The robotic process automation system 24310 may include capabilities, features, structures, methods, algorithms, techniques for learning, human activity emulation, and the like that may be similar to other robotic process automation systems described herein. In the embodiments of FIG. 242, the robotic process automation system 24310 may preform normalization of values of items across a plurality of sets of items, including, for example, selection of a reference set, normalization of values of other items in the plurality of item sets, and the like. As an example, normalization of items B1, B2, and B3 of item set B (in the plurality of item sets 24302) for exchange currency Y 24306 may be performed through application of automation capabilities of the robotic process automation system 24310, optionally without human intervention. In example embodiments, the robotic process automation system 24310 may autonomously perform item value normalization for one or more items across a plurality of item sets for one or more currencies, such as currencies associated with one or more exchanges (e.g., exchange X currency 24304 and/or exchange Y currency 24306).

Normalization Across Currencies

Referring to FIG. 243, computer-implemented methods and systems for automated orchestration of one or more marketplaces may include a set of robotic process automation services that are configured to state the value of a set of items that are represented in a plurality of exchanges, such that representation of the value of each member of the set of items in the plurality of exchanges is normalized based on and optionally across the native currencies of the respective exchanges. A robotic process automation-enabled platform for item value normalization 24400 as depicted in FIG. 243 may receive information for a plurality of sets of items 24402 and 24403 that may be available for transaction in a plurality of exchanges. The information may include exchange currency-specific item values and the like. Items within a set may be available for transaction in one or more of the plurality of exchanges. Each set of items may be available for transactions in one more of the plurality of exchanges as a set, such as a complete set (all items in a set), a partial set (a subset of items from the set), a hybrid set (combinations of items from two or more sets), and the like. Transactions of the one or more sets (and/or items in a set) may be bound by aspects of exchanges in which a transaction occurs. In an example, two exchanges may conduct transactions in two distinct currencies. While jurisdiction-specific currencies are contemplated, different currencies within and/or across jurisdictions are also contemplated, such as various types of cryptocurrencies, conventional currencies, and the like. As an example, a first exchange may value items in a first currency, such as USD. Further, transactions for items in the first exchange may occur using USD. A second exchange may support transactions, item values, and the like in both USD and cryptocurrencies. In addition to item values being based on an exchange-specific currency, fees (optional and/or mandatory) of an exchange (e.g., any of a range of fees that an exchange may charge in association with a transaction, some of which are described herein) may be based on the exchange-specific currency. In example embodiments, exchange fees may be based on an item value (e.g., a sales fee of x % of a transaction amount is charged to a transaction participant of the transaction). A second exchange (optionally within the jurisdiction of the first exchange) may value items in a virtual currency, such as a form of cryptocurrency and the like. Items, services, transaction fees, and the like may also be based on one or more cryptocurrencies of the second exchange. In example embodiments, item values for transactions in an exchange may be expressed for a plurality of currencies when more than one currency is supported by the exchange. Likewise, values for each item and/or each set of items that are transactable through a plurality of exchanges may be expressed in a plurality of exchange currencies. In the embodiments of FIG. 243, values for item sets 24402 may be expressed in exchange X currency units. In this example, values for items in set AX in the plurality of sets 24402 may be stated as AX1 for item A1, AX2 for item A2, AX3 for item A3, and the like. Likewise, values for item sets 24403 may be expressed in exchange Y currency units (e.g., a value for item A1 of set AY may be stated as AY1, etc.).

Transaction participants (e.g., item buyers and sellers and the like), exchange operators, transaction orchestrators, and other transaction facilitators may benefit from normalizing item values for items in sets of items that may be transacted through exchanges with distinct currencies. While cross-currency exchange rates may help participants determine some costs for exchanges with different currencies, normalizing item values in and across exchange currencies may allow participants in a plurality of exchange-currency specific exchanges to determine aspects of item value, such as normalized item relative values within and across exchanges and the like. Examples of a form of item value normalization across a plurality of exchanges is depicted in FIG. 243. The item value normalization platform 24400 may process item values for a plurality of item sets 24402 and 24403 to deliver a normalized value for items across a plurality of currencies (and optionally within an item set and/or across item sets. The item value normalization platform 24400 may deliver a normalized value for items across the plurality of currencies that may be further normalized with currencies of exchanges for which item value normalization is requested. In an example, currency-specific (e.g., exchange currency-specific) value of one or more items in one or more item sets of items maybe normalized across a plurality a plurality of other exchange currencies. In the example, exchange X currency-specific values of items in one or more of SETs AX, BX, and CX 24402 may be normalized for a currency of exchange Y 24406; thereby producing cross-currency normalized item sets AX(Y), BX(Y), and CX(Y) 24412. Similarly, exchange Y currency-specific value of items in one more of sets AY, BY, and CY 24403 may be normalized for currency of exchange X 24404; thereby producing cross-currency normalized item sets AY(X), BY(X), and CY(X) 24414. Specifically, value of item A1 of set A may be stated as AX1 for currency X and may be stated as AY1 for currency Y. When cross-currency normalization is performed by item normalization across currencies system 24408, item A1X currency value AX1 can be normalized based on currency Y to product item value AX(Y)1. In example embodiments, any of item values in the set of items 24402 may be normalized for currency X. Likewise, any of item values in the set of items 24403 may be normalized for currency Y. Therefore, item normalization across currencies system 24408 may process normalized item values and/or non-normalized item values when generating cross-currency normalized item values stated in item value sets 24412 and/or 24414.

A range of normalization approaches may be applied for item value normalization for and/or across multiple currencies. An exemplary approach involves normalizing values for items in a one or more item sets for a given currency (e.g., a reference currency) so that a value of each item is represented relative to the reference currency. In the example of FIG. 243, values of items in the SET A may be stated for a plurality of reference currencies. Value of items in item sets 24402 may be stated for currency X, which may be a first reference currency. Likewise values of items in item set 24403 may be stated for currency Y, which may be a second reference currency. The value of items in SET A for the first reference currency (X) may be processed by the platform 24400 for a second currency (e.g., exchange Y currency) to produce normalized values of SET A items against the reference currency for exchange Y currency 24412. Similarly the value of items in SET A for the second reference currency (Y) may be processed by the platform 24400 for a second currency (e.g., exchange X currency) to produce normalized values of SET A items against the reference currency for exchange X currency 24414.

Normalization of item values across currencies may include identifying one of the currencies as a reference currency. The example embodiments of FIG. 243 suggests either currency X or currency Y as a reference currency. However, a currency other than a currency in which item values are stated and other than a currency in which item values are to be normalized may be identified as a reference currency. In an example, currency X and currency Y may be currencies used to state item values and for use in an exchange for transacting items. A reference currency may be selected (e.g., currency Z). A statement of relationship among the currencies, or at least between reference currency Z and each of currencies X and Y may be applied when performing cross-currency normalization to achieve currency-specific normalization for use in one or more exchanges. A statement of relationship may include a currency exchange rate, and the like.

Determination of a reference currency may be based on factors, such as stability of a currency that may be determined from currency exchange history, futures values, volatility score, geopolitical factors, and the like. Determination of a reference currency may be based exchange rates and/or costs for exchanging currencies. As an example, if an exchange rate for currency X into a plurality of currencies, is favorable over an exchange rate for currency Y for the plurality of currencies, currency X may be selected as a reference currency. Another example of determination of a reference currency may be based on support for the currency by a given exchange. In this example, referring to FIG. 243, currency X 24404 may be selected as a reference currency for normalizing item values for exchange X and currency Y 24406 may be selected as a reference currency for normalizing item values for exchange Y. In this way, the item value normalization across currencies system 24408 may process item values differently for different exchanges, due at least in part to currency support of each different exchange.

Further, currency may be selected as a reference currency due at least in part to relative currency valuation. If, a minimum monetary unit of a first currencies is greater than a minimum monetary unit of a second currency, the second currency may be selected as the reference currency so that normalized values may be expressed in terms of multiples of the reference currency (rather than fractions of the reference currency).

The example embodiments depicted in FIG. 243 may include automation of item value normalization actions, such as those described herein as being performed by and/or enabled by the item normalization system 24408 and the like. Automation may be provided by and/or enabled by robotic process automation techniques as may be performed by a robotic process automation system 24410. The robotic process automation system 24410 may include capabilities, features, structures, methods, algorithms, techniques for learning, human activity emulation, and the like that may be similar to other robotic process automation systems described herein. In the embodiments of FIG. 243, the robotic process automation system 24410 may preform normalization of values of items across currencies, including, for example, selection of a reference currency, normalization of values of items relative to the reference currency, and the like. As an example, normalization of values for items in set 24402 across exchange X currency 24404 and/or exchange Y currency 24406 may be performed through application of automation capabilities of the robotic process automation system 24410, optionally without human intervention. In example embodiments, the robotic process automation system 24410 may autonomously perform item value normalization for one or more items across a plurality of currencies, such as currencies associated with one or more exchanges (e.g., exchange X currency 24404 and/or exchange Y currency 24406).

Value Translation

In embodiments, provided herein are computer-implemented methods and systems for automated orchestration of one or more marketplaces, such methods and systems are provided having a set of robotic process automation services that are configured to automatically translate the value of an item represented in a first exchange into a value of the item for representation in a second exchange. Item value representation may include a range of aspects of value, such as an exchange currency value (e.g., an amount of a currency of an exchange in which the items is being represented that a participant in the exchange may ascribe to an item). This aspect of value may be represented as a sale price, a purchase price, or generally an amount for changing (temporarily, conditionally, permanently, or otherwise) one or more rights (e.g., ownership rights) of the item. Such an aspect of value may be represented as a plurality of aspect-related values. IN an example, a value for taking ownership of an item may be different (e.g., involve a different amount of an exchange currency) than a value for a limited use of the item, which may be different than other aspects of value of an item. Further, a value, such as an amount of an exchange currency to participate in a transaction of/for the item (e.g., purchase the item) may vary relative to a currency of a different exchange. Therefore value translation for representation of a value in a first exchange of an item into a value in a second exchange of an item may involve more than merely converting from a first exchange currency to a second exchange currency.

Further, a value of an item may be based on a wide range of factors and therefore may be impacted by more than just currency exchange rates. In example embodiments, a value of an item may be a multi-dimensional currency-based value, such as a transaction cost plus an ongoing cost, such as to operate/use/consume the item over time. An automobile may be an example of such an item for which a value includes both a purchase value and an operating value.

Ongoing value of an item may include financing terms (e.g., if a buyer finances a transaction for an item, fees of financing may impact the value). Ongoing costs may vary from one exchange jurisdiction to another, thereby impacting translation of a value of an item from one exchange to another. In an example, fuel-related costs in a first jurisdiction may be higher or lower than those in a second jurisdiction. Therefore, translating value for an item in an exchange of a low fuel cost jurisdiction to be represented in an exchange of a high fuel cost jurisdiction may take into consideration differences in fuel costs. Many other ongoing costs may factor into translation of a value of an item.

Robotic process automation-based value translation may include translation of aspects of value of an item that may be time-dependent, such as an expiration date, a production sequence (e.g., serial) number of the item, and the like. In example embodiments, time-dependent value aspects may be determined from one or more algorithms that take into account time variation when determining value of an item. An example of time-dependent value translation may include market-based changes in currency exchange between the currencies of two exchanges. Representing a value of an item in a target exchange (e.g., that supports a target currency), where the item value is translated from an originating exchange (e.g., that supports an originating currency) may require dynamic representation based on ongoing currency exchange variation. Further, independent of currency variation, an originating exchange value for an item may vary due to a range of factors that may be outside of direct control of the exchange, such as quality reports for comparable items transacted in the originating exchange. Therefore, as a representation of originating exchange item value varies, translation of the item value from the originating exchange item value for presentation in a target exchange may dynamically make a corresponding change in a target exchange value.

In example embodiments, translation of item value from a first exchange for representation of item value in a second exchange may include dependencies, such as volume dependencies, jurisdiction rule dependencies, market-specific (e.g., costs) dependencies (e.g., tariffs, and the like). Volume, such as a relative volume of an item available in an exchange may impact translation of value from a first exchange to a second exchange. As an example, a volume of available product in first exchange (from which item value is being translated) may be limited. A volume of available product in a second exchange (to which item value is being translated) may not be limited, at least not comparably to volume limits of the first exchange. Translation of item value in such a situation may result in a volume-based adjustment in item value during translation. In this example, a value in a first exchange of the item may, based on supply and demand pricing principles generally, not directly translate based on currency exchange rates. Rather, due to greater availability of the item in the second exchange, a translated value for the item may result in a value that is lower (potentially substantively lower) might be suggested based on currency exchange rates.

In example embodiments, tariffs may impact item value translation. Tariffs imposed on items being moved from a first jurisdiction (e.g., where an item is available for transaction in a first exchange) to a second jurisdiction (e.g., where the item is desired to be transacted) may impact translation of value of the item. One such impact may be adding the value of the tariff to the value of the item as part of value translation. Generally, a nature of tariffs is that they are no evenly applied across all types of items even from a single jurisdiction. Therefore, translation of value of an item may include determining if a tariff applies, the amount of the tariff, and conditions for imposing the tariff (e.g., a non-profit buyer may not pay the full tariff).

In embodiments, translation of value of an item from a first exchange to represent a value of the item in a second exchange may include conditional value factors. In example embodiments, conditional value factors may be outside of a control sphere of the second exchange. Aspects, such as seasonal factors, weather factors, geopolitical stability, and the like may impact a representation of value of an item. In an example for an impact of seasonal factors on value, an item that provides essential features for one season (e.g., a thermally insulated coat for a Winter season) may have a representation of value in a first exchange based on the seasonal conditions locally for the first exchange (e.g., northern climates during Winter). Translating a value for this item to a second exchange (e.g., where the local season is Summer) may impact (e.g., reduce) a represented value for the item in the second exchange more substantively than may occur due to currency exchanges rates, for example. Geopolitical factors may impact item value translation. In example embodiments, risks of timely delivery of an item represented in a first jurisdiction that lacks political stability to a recipient in a second jurisdiction where a transaction for the item occurs at least in part in an exchange in the second jurisdiction may impact a translation of value of an item. In an example, an operator of the exchange in the second jurisdiction may require imposing additional fees in such cases (e.g., to secure timely transfer, and the like), thereby impacting the translation of value of the item.

In example embodiments, translation of value of an item from a representation of value of an item in a first exchange to represent a value for an item in a second exchange may include exchange-based factors. Exchange-based factors may include, exchange fees (e.g., overhead associated with transactions for items in an exchange), value-impacting conditions (e.g., compulsory insurance), and the like. Translation of value of an item represented in a high-overhead exchange may factor differences in exchange overhead when representing a value in a low-overhead exchange. Translation of value may, in this regard, consider and evaluate contributors to item value differently based on exchange. Whereas a core value of an item may be one contributor to a representation of item value in a first exchange, exchange overhead for the item in the first exchange may be separated from the representation of value during value translation. In an example, a currency exchange rate-based factor may be applied to the core value, and a target exchange overhead may supplement the translated core value to arrive at a representation of value of the item in the target exchange, leaving the first exchange high overhead out of the final representation of value translation.

For translation of value of multiple similar items, aspects that differentiate the otherwise similar items may impact value translation. In an example, translation of value of bottles of wine may vary substantively based on, for example, vintage of individual bottles. Value for a case of wine with mixed vintage bottles (or a collection of items grouped into a set of mixed vintage bottles of wine) may be translated differently than for single vintage bottles (e.g., where a single translation factor may be applied to each of the bottles). In another example, translating a value of identical items from a production line may be impacted by aspects of the items, such as a serial number of the item. A first serial number, a milestone-type serial number (e.g., 1,000,000), a final production serial number, and the like may be valued differently than other items from the production run. In example embodiments, determining such aspects of items for value translation may provide improved value translation for representation of an item value in a target exchange.

Item value may further be based on a perception of a participant in a transaction for the item. In a simple example, a value of an item to a buyer may be different than a value to a seller of the item. In example embodiments, taxation may impact an exchange participant differently in different exchanges. A value to an exchange participant in a first exchange may include no sales tax, whereas a sales tax may be imposed on transactions conducted in a target exchange. Therefore, value translation may factor tax treatment of transactions in the two exchanges into a representation of value. Another miscellaneous value that may impact an exchange participant's perception of value may include access to credit/funding, such as with favorable borrower terms for conducting transactions in an exchange. Translating a representation of value of an item in a first exchange that includes one or more of these factors that are different from value-impacting factors of target exchange may include adaptation of a representation of a value of the item in the target exchange to include such supplemental value aspects.

Item value for translation among exchanges may include post-transaction value. An example of such value differentiation may include post-transaction value. Post-transaction value for items transacted in a first exchange may include residual income based on use of the item. In a second exchange, post-transaction value may be derived from accrual of energy/carbon credits based on item use. Yet another example of post-transaction value that may impact value translation may include benefits to, for example a seller for use of an exchange. A value to a seller in a first exchange may include advertising/promotional credits for future use with the exchange. One such example credit may include access to social media influencers associated with the exchange. A post-transaction value to a seller in a second exchange may include accrual of credits toward exchange fees that may be used by the seller, transferred to other sellers, and the like. Yet another example of post-transaction factors that may impact value translation may include transaction fee basis differences. A transaction fee may be applied to a transaction at the successful conclusion of the transaction (e.g., the buyer releases funds to the seller). In a first exchange the fee may be transaction amount-based; in a second exchange the may be fixed or at least partially independent of the transaction amount.

Item Value Translation

Referring to FIG. 244, embodiments are depicted of a set of robotic process automation services that are configured to automatically translate the value of an item represented in a first exchange into a value of the item for representation in a second exchange. Left side of the figure generally depicts a first exchange value representation; the right side generally depicts a second or target exchange item value representation. For discussion of the embodiments of FIG. 244, a first exchange may include Exchange X 24602; a second/target exchange may include Exchange Y 24504. Value translation may be performed by a value translation system 24510. The value translation system 24510 may access exchange X metadata 24506 that may include one or more of the factors described above, such as transaction fees, access to funding, meaning of terminology, historical treatment of some factors, supported currencies, and the like that are associated with item value representation associated with Exchange X 24502. The value translation system 24510 may access a comparable data store of exchange item value representation associated metadata 24508 for exchange Y 24504. The value translation system 24510 may, among other things, process the exchange metadata (e.g., X exchange metadata 24506 and/or Y exchange metadata 24508, or portions thereof) to develop an understanding of how X exchange item value representation compares and/or relates to Y exchange item value representation. In an example, the value translation system 24510 may determine from such processing that exchange overhead that may be represented in item values for exchange Y may be a multiple of exchange overhead for exchange X. This value translation-impacting determination may be based using a comparative process for overhead values stated for each exchange, (e.g., 1% for exchange X and 1.2% for exchange Y). Determining one or more relationships of exchange overhead to item value representation for translating value my include parsing descriptive information (e.g., Exchange X overhead description: "An exchange transaction fee of one percent of transaction amount is included in each transaction"; exchange Y overhead description: "Participants are required to pay a monthly exchange participant fee of one percent of average trailing month transaction amount") and making an adjustment to a representation of exchange overhead value impact based on, for example information captured from the metadata datasets 24506 and/or 24508.

As variously described herein, a representation of an item value may be multidimensional. Item value representation for translation from a first exchange may include value dimension associated with an intrinsic value of an item 24512. This may, for example, be an amount that a current owner of the item paid for the item (e.g., in an earlier transaction in the first or another exchange). An intrinsic amount for an item of currency (e.g., digital/crypto currency) may be a derived from a quantity of the item of currency and a currently discernable value of a unit of the corresponding currency. In example embodiments, an intrinsic value 24512 dimension of a representation of value of an item in a first exchange may be market-based, such as based on intrinsic value dimensions of comparable items. In this example, transaction history may play a role in determining an intrinsic value dimension of a representation of item value. Comparable item sales may generally suggest an intrinsic value dimension. A relevance and impact of an intrinsic value dimension of item value representation may, as described herein in examples and for embodiments depicted in the figures, be impacted by a range of factors, including, without limitation a quantity of the items available in the exchange (supply) and a degree of demand for the items. Similarly, an intrinsic value dimension of value representation may be influenced by similarity of an item to other items in the source exchange, the target exchange, or generally known by the value translation system 24510. Intrinsic differences in items (e.g., expected service life, damage history, specific features/upgrades, and the like) may determine, at least in part, how an intrinsic value dimension of an item in a first exchange is translated and impacts a representation of value of the item in a second exchange. The value translation system 24510 may process intrinsic value dimension 24512 information, along with intrinsic value-impacting metadata when producing a representation of value of an item including a target exchange intrinsic value dimension 24522.

In example embodiments, other value determining dimensions that may impact translation and representation of item value across exchanges may include, for a first exchange (e.g., exchange X 24502) a first exchange seller value dimension 24514, a first exchange buyer value dimension 24516, a first exchange platform value dimension 24518, and the like.

The value translation system 24510 may be operated, such as by an autonomous robotic process automation system 24509, to translate each dimension of value in a representation of value of an item in a first exchange into a corresponding dimension of value for item value representation in a second/target exchange. Translation of one or more first exchange seller value dimensions 24514 into corresponding target exchange seller value dimension(s) 24524 may include determination of first exchange seller value dimension 24514 factors and a contribution of at least a portion of such factors on a first exchange representation of item value. In a non-limiting example, a seller of an item in a first exchange for which item value is to be translated by the value translation system 24510, may have to pay a listing fee for the first exchange. This item of seller value dimension 24514 may not be present in the target exchange. Therefore translation of a first exchange seller value dimension 24514 to a corresponding second exchange seller value dimension 24524 may include elimination of a listing fee factor impact on the item value representation in the second exchange. In another example of translation of item value that may be impacted by seller value factors, currency preferences of the seller may be such a factor. In this example, a seller (e.g., the same seller/item owner in each of the first and target exchanges) may prefer to receive payments in cryptocurrency. The first exchange may not support cryptocurrency transactions, so the seller of the item in the first exchange must include in a seller value dimension transaction value in the form of a non-preferred currency. The implications of performing transactions in the first exchange may result in the seller setting a value (e.g., a higher sale price) that takes into consideration a measure of onus to the owner. Translation of item value may take into consideration this impact on a seller value dimension of item value. In this example, a robotic process automation-based autonomous item value translation may determine that a seller would adapt his/her perspective on item value based on the second/target exchange supporting a seller-preferred currency; in this example, a cryptocurrency.

Translating item value for representation from a first exchange value representation to a second exchange item value representation may include translating a first exchange buyer value dimension 24516 to determine a corresponding second/target exchange buyer value dimension 24526. While generally, buyers and sellers may express different values for an item, such as for the purposes of each of the buyer and seller maximizing, for example, value of a transaction, which may include a higher sale price from the seller's perspective and a lower price from the buyer's perspective. Further when translating a value of an item for representation in a second exchange, second exchange buyer value dimension factors may impact a buyer's perspective value differently than another buyer's perspective of item value in a first exchange. A range of buyer value dimension 24526 impacting factors are described herein. In example, a potential buyer in a first exchange may have ready access to multiples of an item in a first exchange. A potential buyer in a second exchange may have limited access to the item. In this simple example, a first exchange buyer value dimension 24516 may have a negligible impact on item value representation. However, a second exchange buyer value dimension 24526 may have a substantive impact on item value in the second exchange. The translation system 24510 may detect/determine these two different buyer value dimension factors and adjust a representation of value during translation accordingly. Other buyer value dimensions (first exchange 24514, second exchange 24524) dimensions may include tax differences, and the like.

Another candidate dimension of value that contributes to a representation of item value in a first exchange may include a first exchange value dimension 24518. Exchange value dimension 24518 may include exchange-based impacts on item value, such as support in operations of the first exchange for promoting, transacting, financing, and delivery of an item. If, for example, support for promoting and financing transactions for the item is available in a first exchange and is not available in a second exchange, translation of item value from the first exchange to the second exchange may be influenced by this difference in exchange value. In this example, a representation of value of an item in the first exchange may include a representation of the exchange support factors; however, a corresponding representation of item value in the second exchange may not. For autonomous value translation, such as by a robotic process automation system 24509, detecting and adjusting value of an item in a second exchange that does not include comparable exchange value 24528 may result in a representation of value that expresses these differences in exchange value.

In example embodiments, value translation, such as through a robotic process automation system 24509 operating a value translation system 24510 may rely on, among other things, artificial intelligence-based value translation algorithms 24520. These algorithms 24520 may be configured, adapted, and maintained through use of machine learning-based feedback, such as from a feedback system 24530. As an example, a translation algorithm that facilitates conversion of a plurality of dimensions of item value from a representation of item value in first exchange for generating a representation of value of the item in a second exchange may benefit from feedback, such as relevance of a result of translation of one or more of the value dimensions, such as intrinsic, seller, buyer, and exchange. A feedback system 24530 may gather information from a second exchange, such as information that facilitates validation of translation algorithms that validate translation actions, such as translating one or more aspects of intrinsic value. Techniques for gathering feedback may include capturing data from a plurality of sensors disposed logically and/or physically throughout aspects of a second exchange, such as sensors that detect bidding by buyers for an item for which value was translated. Feedback that suggests that, for example, buyers generally place bids that are consistent with a representation of value of the item, reinforces value translation algorithms 24520 used to generate translated value. Feedback from, for example, smart contract configured for automating transactions of items in a second exchange (e.g., terms associated with exchange fees) may validate one or more translation actions, such as translating a first exchange exchange-value 24518 to a second exchange exchange-value 24528. Disclosed herein are a range of feedback-based machine learning techniques that may be applied to the methods and systems of value translation of the embodiments of FIG. 244.

Value Translation and Conditional External Factors

Referring to FIG. 245, embodiments are depicted of a set of robotic process automation services that are configured to automatically translate the value of an item represented in a first exchange into a value of the item for representation in a second exchange while taking into consideration external factors that may result in a translation of value that is conditional based on the external factors. For discussion of the embodiments of FIG. 245, a first exchange may include Exchange X 24602; a second/target exchange may include Exchange Y 24604. Value translation, including producing a conditional value based on external factors, may be performed by a value translation system 24610. The value translation system 24610 may access exchange X metadata 24606 that may include one or more of the factors described above, such as transaction fees, access to funding, meaning of terminology, historical treatment of some factors, supported currencies, and the like that are associated with item value representation associated with Exchange X 24602. The value translation system 24610 may access a comparable data store of exchange item value representation associated metadata 24608 for exchange Y 24604. The value translation system 24610 may, among other things, process the exchange metadata (e.g., X exchange metadata 24606 and/or Y exchange metadata 24608, or portions thereof) to develop an understanding of how X exchange item value representation compares and/or relates to Y exchange item value representation. In an example, the value translation system 24610 may determine from such processing that exchange overhead that may be represented in item values for exchange Y may be a multiple of exchange overhead for exchange X. Further exchange overhead may be influenced by external factors that may suggest translation of value may be conditional. This value translation-impacting determination may be based using a comparative process for overhead values stated for each exchange, (e.g., 1% for exchange X and 1.2% for exchange Y). Determining one or more relationships of exchange overhead to item value representation for translating value my include parsing descriptive information (e.g., Exchange X overhead description: "An exchange transaction fee of one percent of transaction amount is included in each transaction"; exchange Y overhead description: "Participants are required to pay a monthly exchange participant fee of one percent of average trailing month transaction amount") and making an adjustment to a representation of exchange overhead value impact based on, for example information captured from the metadata datasets 24606 and/or 24608.

As variously described herein, a representation of an item value may be multidimensional. Further, external value factors 24632, such as factors outside of at least direct control of an exchange (and/or an operator or participant of an exchange) may influence one or more dimensions of item value. Item value representation for translation from a first exchange may include value dimension associated with an intrinsic value of an item 24612. This may, for example, be an amount that a current owner of the item paid for the item (e.g., in an earlier transaction in the first or another exchange). An intrinsic amount for an item of currency (e.g., digital/crypto currency) may be a derived from a quantity of the item of currency and a currently discernable value of a unit of the corresponding currency. In example embodiments, an intrinsic value 24612 dimension of a representation of value of an item in a first exchange may be based on one or more external factors, such as after-market trading activity (e.g., private sales) of the item, comparable items and the like. An external value factor 24632 that may impact intrinsic value differently for different exchanges may include weather-based differences between typical use environments of the exchanges. An item that has a high intrinsic value in an exchange that is experiencing winter conditions may have a low intrinsic value for an exchange experiencing mild weather.

A relevance and impact of an intrinsic value dimension of item value representation may be impacted by a range of external factors, including, without limitation a quantity of the items available to buyers in a jurisdiction of an exchange (supply) and a degree of demand for the items. Similarly, an intrinsic value dimension 24612 of value representation may be influenced by similarity of an item to other items in the source exchange, the target exchange, external to either or both exchanges, and otherwise generally known by the value translation system 24610. Intrinsic differences in items (e.g., expected service life, damage history, specific features/upgrades, after-sale offers that are outside of the exchange, and the like) may determine, at least in part, how an intrinsic value dimension of an item in a first exchange is translated and impacts a representation of value of the item in a second exchange. External value factors 24632, such as a likelihood of an environmental event/weather conditions and the like, particularly when those external factors differ among exchanges, may impact translation of an intrinsic dimension of value. The value translation system 24610 may process intrinsic value dimension 24612 information, along with intrinsic value-impacting metadata, and optionally with intrinsic value-impacting external value factors 24632 when producing a representation of value of an item including a target exchange intrinsic value dimension 24522.

In example embodiments, other value determining dimensions that may impact translation and representation of item value across exchanges may include, for a first exchange (e.g., exchange X 24602) a first exchange seller value dimension 24614, a first exchange buyer value dimension 24616, a first exchange platform value dimension 24618, and the like. Factors that may impact translation of one or more of the first exchange dimensions of value may include external value factors 24632 and/or results of processing the external factors 24632, such as with a conditional value processing system 24634.

The value translation system 24610 may be operated, such as by an autonomous robotic process automation system 24609, to translate each dimension of value in a representation of value of an item in a first exchange into a corresponding dimension of value for item value representation in a second/target exchange. Robotic process automation-based translation may also include generating a conditional value factor 24634 and applying that factor to the translation of one or more first exchange seller value dimensions 24614 into corresponding target exchange seller value dimension(s) 24624 may include determination of first exchange seller value dimension 24614 factors and a contribution of at least a portion of such factors on a first exchange representation of item value. In a non-limiting example, a seller of an item in a first exchange for which item value is to be translated by the value translation system 24610, may have to pay a listing fee to a listing service that is external to the first exchange. This external factor of seller value dimension 24624 may not be present in the target exchange. Therefore translation of a first exchange seller value dimension 24614 to a corresponding second exchange seller value dimension 24624 may include elimination of an external service listing fee factor impact on the item value representation in the second exchange.

Translating item value for representation from a first exchange value representation to a second exchange item value representation may include translating a first exchange buyer value dimension 24616 to determine a corresponding second/target exchange buyer value dimension 24626. Further when translating a value of an item for representation in a second exchange, second exchange buyer value dimension factors may impact a buyer's perspective value differently than another buyer's perspective of item value in a first exchange. A range of buyer value dimension 24626 impacting factors, at least some of which may be influenced by external value factors 24632 are described herein. In example, a quantity of items available to a potential buyer in a first exchange may be limited by external factors, such as rules that limit a number of items purchased based on an economic classification of the buyer (e.g., quantities allowed for foreign nationals may be limited). A potential buyer in a second exchange may not have such limits on access to the item. In this simple example, a first exchange buyer value dimension 24616 may have a conditional impact on item value representation (e.g., economic classification). However, a second exchange buyer value dimension 24626 may have a no such impact on item value in the second exchange. The translation system 24610 may detect/determine these two different buyer value dimension factors and adjust a representation of value during translation accordingly. Other external factor influenced buyer value dimensions (first exchange 24614, second exchange 24624) dimensions may include tax differences, and the like.

Another candidate dimension of value that contributes to a representation of item value in a first exchange may include a first exchange value dimension 24618. Exchange value dimension 24618 may include exchange-based impacts on item value, such as support in operations of the first exchange for promoting, transacting, financing, and delivery of an item. If, for example, support for promoting and financing transactions for the item is available in a first exchange and is not available in a second exchange, external value factors (e.g., third-parties providing these services) may influence translation of item value from the first exchange to the second exchange.

In example embodiments, value translation, such as through a robotic process automation system 24609 operating a value translation system 24610 may rely on, among other things, artificial intelligence-based value translation algorithms 24620. These algorithms 24620 may be configured, adapted, and maintained through use of machine learning-based feedback, such as from a feedback system 24630. These algorithms 24630 may further be adapted based on external value factors 24632 that may be structured as a conditional value impact 24634.

In an example of feedback of an impact of value 24630, a translation algorithm that facilitates conversion of a plurality of dimensions of item value from a representation of item value in first exchange for generating a representation of value of the item in a second exchange may benefit from feedback, such as relevance of a result of translation of one or more of the value dimensions, such as intrinsic, seller, buyer, and exchange. A feedback system 24630 may gather information from a second exchange, such as information that facilitates validation of translation algorithms that validate translation actions, such as translating one or more aspects of intrinsic value. Techniques for gathering feedback may include capturing data from a plurality of sensors disposed logically and/or physically throughout aspects of a second exchange, such as sensors that detect bidding by buyers for an item for which value was translated. Feedback that suggests that, for example, buyers generally place bids that are consistent with a representation of value of the item, reinforces value translation algorithms 24620 used to generate translated value. Feedback from, for example, smart contract configured for automating transactions of items in a second exchange (e.g., terms associated with exchange fees) may validate one or more translation actions, such as translating a first exchange exchange-value 24618 to a second exchange exchange-value 24628. Disclosed herein are a range of feedback-based machine learning techniques that may be applied to the methods and systems of value translation of the embodiments of FIG. 244.

In an example of external value factor 24632 impact on value translation, such as an impact of a conditional value factor 24634, an impending weather event in a target use market of items purchased in a second exchange may increase an impact of one or more of the dimensions of value. Further as a risk of the impending weather event increases or abates (which may be expressed as an external value factor conditional value 24634, a translation algorithm 24620 may be adapted accordingly.

Token Generation from Item Characteristics

In example embodiments, provided herein are computer-implemented methods and systems for automated orchestration of one or more marketplaces, such methods and systems are provided having a set of robotic process automation services that are configured to generate a token that represents an item in an exchange based on characteristics of the item determined from data from a different exchange. An item may be contain and/or be associated with and/or be represented by a plurality of characteristics. Characteristics of an item that may be used to generate a token representing the item in an exchange may include a range of types of characteristics. Just a few examples include: physical characteristics (e.g., size, weight, volume, quantity, material, etc.), value-based characteristics (e.g., cost to purchase, cost to operate, tax value, energy value, collectability, etc.), accessibility characteristics (e.g., when an item is accessible, for now long, under what conditions can the item be accessed, and the like). In example embodiments, employing robotic process automation services to autonomously generate a token that represents an item in an exchange may benefit from an understanding of the various types of characteristics, their relative importance (e.g., weight) for a first/source exchange and for a second/target exchange.

Further, token generation may be performed for one or more purposes, at least a few of which may impact a token generation process, optionally including determining which characteristics of the item to rely upon when generating a token for representing the item. As an example, if an objective of token generation is to maximize transaction value of the item, characteristics that are associated with enhanced valuation of an item may be usefully processed to generate the token. If, for example, an object of generating a token is to achieve a very quick transaction (e.g., sale, rental, etc.) of the item, characteristics that engender such interest may be a focus of a representative token generation process. In yet another example, if an objective of generating a token that is representative of an item is to attract certain candidate buyers, corresponding characteristics may be a substantive part of representative token generation.

Referring to FIG. 246, embodiments of methods and systems for generating tokens that are representative of one or items based at least in part on characteristics of the items are depicted. More specifically, embodiments for methods and systems of robotic process automation-based token generation are depicted. In example embodiments, token generation for representation of an item in a second exchange may be based on characteristics of the item determined from data from a first (e.g., different) exchange. The embodiments depicted in FIG. 246 may include a first exchange X 24702 from which item characteristics 24706 are retrieved for token generation, e.g., via token generation system 24712 that may produce item token 24714 for exchange y 24704. At least one objective of such a system may be to configure a robotic process automation system to capture item characteristics 24706 of an item that is available in a first exchange; process those characteristics; and produce an item token 24714 that is useful in representing the item in a target exchange, such as exchange Y 24704.

In example embodiments, an item of a source exchange 24702 is identified, such as by designation through a user interface, automatically, semi-automatically, and the like. Generally independent of a means by which an item is identified for representative token generation, given that an item is identified, a robotic process automation process may automate collection of characteristics of the item 24706 from the first exchange 24702. Characteristics collection may be based on one or more mechanisms by which a first exchange makes information that is descriptive and/or contains characteristics of an item. In example, a first exchange 24702 may provide and/or make available a directory (e.g., list and the like) of items in the exchange. The list may include a set of characteristics for the item, such as identifying characteristics, physical characteristics, ownership characteristics, performance/service characteristics, pricing and sales terms characteristics, and the like. Therefore, in an example of representative item token generation, a method of token generation, optionally through operation of a robotic process automation system 24710, may retrieve item characteristics 24706 of an identified item (not shown) and deliver the same to a token generation system 24712 whereat one or more item representative tokens 24714 may be generated.

The token generation system 24712 may process one or more retrieved item characteristics (e.g., characteristics of an item that is represented in a first exchange 24702) for generating an item token 24714 along with characteristics rules 24708 of a target exchange (e.g., exchange Y 24704 in the embodiments of FIG. 246). Target exchanges may maintain the set of characteristics rules 24708 to facilitate, among other things, representing an item based on item characteristics, and optionally for use and/or understanding of item characteristics. The token generation system 24712 may query one or more control facilities, such as an exchange control tower of a target exchange to retrieve characteristics rules that are pertinent to token generation. In an example of characteristic rule querying, an item characteristic retrieved for an item for which a representative token is being generated may indicate a dimension of the item in imperial units. The token generation system 24712 may generate a query (e.g., a lookup type data structure) that indicates information about the characteristic, such as the type of characteristic, data of the instance of the type of characteristic, and the like. In this example the token generation system may present a query data structure that includes at least a type attribute (physical dimension), and optionally a value attribute (3.1), and a unit attribute (e.g., imperial inches). The token generation system 24712 may access a target exchange characteristics rules data structure 24708, such as by comparing one or more of the query data structure elements to entries in the rules data structure 24708. Alternatively, the query data structure may be presented to the exchange control tower or other exchange management facility whereat a search or other action is taken of a rules data structure to provide a corresponding characteristic rule for use in generating a representative token based at least in part on the specific item characteristic. Further in this example, a corresponding characteristics rule may indicate that for compliance with physical dimension characteristics of items in the target exchange, units for such values are to be metric. When this rule is applied, the token generation system 24712 may convert the item dimension of 3.1 inches to a corresponding quantity of metric dimension (e.g., 78.74 mm); thereby causing the physical dimension characteristic to be represented in and/or by the generated item token 24714 in metric units.

Another example of use of characteristics rules by a token generation system 24712 may include minimum quantity characteristics. An item characteristic may indicate that a minimum transaction quantity of the item in a transaction is based on item count (e.g., a single item). A characteristic rule may require that a minimum transaction quantity of an item in the target exchange be based on transaction amount. Therefore, based on item cost, when applying the minimum transaction quantity rule, a minimum item count for a transaction to be represented by the generated item token 24714 may be greater than a single item.

A generated item token 24714 that is representative of the item may be encoded with the item characteristics. Characteristics of an item that indicate physical aspects of the item may be encoded as displayable elements in the token (e.g., color, general shape, relative size, and the like). Characteristics that are time-related (e.g., expiration date, automatic renewal date, best-by date, offer validity timeframe, changes in characteristics over time, and the like) may be encoded as terms and/or conditions of a corresponding smart contract. Characteristics that are value related (e.g., purchase costs, operating costs, residual fees, return fees, finance fees, and the like) may be encoded in the token. In example embodiments, a generated item token 24714 may reference a companion set of item characteristics 24716 that are associated with token. The item characteristics 24706, processed and adjusted as needed based on exchange rules 24708 by the token generation system 24712 may be output to a characteristics data structure 24716 that is linked to a generated token 24714.

In example embodiments, the methods and systems of characteristics-based token generation may be performed by a robotic process automation service 24710 that may be trained on a set of token generation actions, such as actions taken by humans, the token generation system 24712 and the like. Robotic process automation services 24710 may facilitate autonomous generation of representative tokens based on item characteristics of an item of a source exchange for use in a target exchange. Robotic process automation services 24710, when combined with the token generation system 24712 capabilities and processing systems may automate conversion of a plurality of sets of item characteristics in a first exchange to item-representative tokens in a second exchange.

Token Generation from Item Token with Characteristic Harvesting Algorithm

Referring to FIG. 247, embodiments of methods and systems for generating tokens that are representative of one or items based at least in part on characteristics of the items are depicted. More specifically, embodiments for methods and systems of robotic process automation-based token generation are depicted. In example embodiments, token generation for representation of an item in a second exchange may be based on characteristics of the item determined from data extracted from a token (e.g., a digital representation) of the item from a first (e.g., different) exchange. The embodiments depicted in FIG. 247 may include a first exchange X 24802 that includes and/or makes use of item tokens 24806 from which item characteristics are determined for token generation, e.g., via token generation system 24812 that may produce a target exchange item token 24814 for exchange y 24804. At least one objective of such a system may be to configure a robotic process automation system to harvest item characteristics from a token 24806 of an item that is available in a first exchange; process those characteristics; and produce a target exchange item token 24814 (and optionally a companion set of item characteristics 24816) that is useful in representing the item in a target exchange, such as exchange Y 24804.

In example embodiments, an item of a source exchange 24802 is identified, such as by designation through a user interface, automatically, semi-automatically, and the like. Generally independent of a means by which an item is identified for representative token generation, given that an item is identified, a robotic process automation process may automate harvesting of characteristics of the item from an item token 24806 of the first exchange 24802. Characteristics harvesting may be based on one or more characteristics harvesting algorithms 24818 that may be used to process an item representative token 24806 of a first exchange to determine information that is descriptive and/or contains characteristics of an item. In an example, a first exchange 24802 may provide and/or make available a directory (e.g., list and the like) of items and corresponding item tokens 24806 in the exchange. The list may include and/or reference a set of characteristics represented by the item token 24806 for each item, such as identifying characteristics, physical characteristics, ownership characteristics, performance/service characteristics, pricing and sales terms characteristics, and the like. Therefore, in an example of representative item token generation, a token generation system 24812, optionally through operation of a robotic process automation system 24810, may process an item-representative token 24806 with characteristics harvesting algorithms 24818 to retrieve item characteristics of an identified item (not shown) and generate one or more target item representative tokens 24814 for a second/target exchange.

The characteristic harvesting algorithms 24818 may facilitate conversion of item-representative token content, optionally a digital representation of the item including characteristics of the item into item characteristics suitable for use by the token generation system 24812 to produce at least a corresponding target exchange item representative token. A digital representation of an item 24806 may contain and/or reference a wide range of aspects associated with an item of an exchange. Some of the aspects may characterize the item; some may characterize a context of the exchange that is pertinent to the item, others may be indicative of a seller, a broker, use and other conditions, and the like. The characteristics harvesting algorithms 24818 may facilitate parsing item token 24806 content to distinguish among the potentially many types of content, only some of which may be pertinent to target exchange item representative token generation. In example embodiments, digital representation of source exchange aspects in an item token 24806 may not be pertinent to generating a target exchange item-representative token 24814 and therefore may be effectively filtered by application of one or more of the characteristic harvesting algorithms 24818. The characteristics harvesting algorithms 24818 may reference a set of characteristics types that may be associated with different target exchanges. The token generation system 24812 may, through the algorithms, identify for retrieval and for processing a portion of the set of characteristics types that are associated with the target exchange (exchange Y 24804 in the embodiments of FIG. 247). In example embodiments, robotic process automation services 24810 may facilitate automated execution of this aspect of token generation for configuring an instance of the token generation system 24812 for generating a target exchange item-representative token for a target exchange 24804 from an item-representative token 24806 of a source exchange 24802.

The token generation system 24812 may process one or more harvested item characteristics (e.g., characteristics of an item retrieved from an item token 24806 of a first exchange 24802) for generating a target exchange item token 24814 along with characteristics rules 24808 of a target exchange (e.g., exchange Y 24804 in the embodiments of FIG. 247). Target exchanges may maintain the set of characteristics rules 24808 to facilitate, among other things, representing an item based on item characteristics, and optionally for use and/or understanding of item characteristics. The token generation system 24812 may query one or more control facilities, such as an exchange control tower of a target exchange to retrieve characteristics rules that are pertinent to token generation. In an example of characteristic rule querying, an item characteristic retrieved for an item for which a representative token is being generated may indicate a dimension of the item in imperial units. The token generation system 24812 may generate a query (e.g., a lookup type data structure) that indicates information about the characteristic, such as the type of characteristic, data of the instance of the type of characteristic, and the like. In this example the token generation system may present a query data structure that includes at least a type attribute (physical dimension), and optionally a value attribute (3.1), and a unit attribute (e.g., imperial inches). The token generation system 24812 may access a target exchange characteristics rules data structure 24808, such as by comparing one or more of the query data structure elements to entries in the rules data structure 24808. Alternatively, the query data structure may be presented to the exchange control tower or other exchange management facility whereat a search or other action is taken of a rules data structure to provide a corresponding characteristic rule for use in generating a representative token based at least in part on the specific item characteristic. Further in this example, a corresponding characteristics rule may indicate that for compliance with physical dimension characteristics of items in the target exchange, units for such values are to be metric. When this rule is applied, the token generation system 24812 may convert the item dimension of 3.1 inches to a corresponding quantity of metric dimension (e.g., 78.74 mm); thereby causing the physical dimension characteristic to be represented in and/or by the generated target exchange item token 24814 in metric units.

Another example of use of characteristics rules by a token generation system 24812 may include minimum quantity characteristics. An item characteristic harvested from or based on a first exchange item representative token 24806 may indicate that a minimum transaction quantity of the item in a transaction is based on item count (e.g., a single item). A minimum transaction quantity-associated characteristic rule for a target exchange may require that a minimum transaction quantity of an item in the target exchange be based on transaction amount. Therefore, taking into consideration item unit cost, when applying this example target exchange minimum transaction quantity rule, a minimum item count for a transaction to be represented by the generated target exchange item token 24814 may be greater than a single item.

A generated target exchange item token 24814 that is representative of the item may be encoded with the item characteristics. Characteristics of an item that indicate physical aspects of the item may be encoded as displayable elements in the token (e.g., color, general shape, relative size, and the like). Characteristics that are time-related (e.g., expiration date, automatic renewal date, best-by date, offer validity timeframe, changes in characteristics over time, and the like) may be encoded as terms and/or conditions of a corresponding smart contract. Characteristics that are value related (e.g., purchase costs, operating costs, residual fees, return fees, finance fees, and the like) may be encoded in the token. In example embodiments, a generated item token 24814 may reference a companion set of item characteristics 24816 that are associated with token. The item characteristics 24806, processed and adjusted as needed based on exchange rules 24808 by the token generation system 24812 may be output to a characteristics data structure 24816 that is linked to a generated token 24814.

In example embodiments, the methods and systems of FIG. 247 for characteristics harvesting and target exchange token generation may be performed by a robotic process automation service 24810 that may be trained on a set of token generation actions, such as actions taken by humans, the token generation system 24812 and the like. Robotic process automation services 24810 may facilitate autonomous generation of representative tokens based on item characteristics of an item of a source exchange for use in a target exchange. Robotic process automation services 24810, when combined with the token generation system 24812 capabilities and processing systems may automate conversion of a plurality of sets of item characteristics in a first exchange to item-representative tokens in a second exchange.

In example embodiments, the methods and systems for item characteristic harvesting and target exchange token (and optional smart contract) generation may include converting a token from a first exchange to a token for the target exchange. Such token conversion may include deriving item characteristics from the first exchange token, such as by use of item characteristic harvesting algorithms 24818 and the like and producing an item token for the item for a target exchange that is consistent with governing rules of the target exchange. A non-limiting governing rule of a target exchange may include use of an exchange-preferred currency, which may be different than a currency of the exchange from which the item characteristics in a corresponding token are harvested. An example of achieving compliance with target exchange governing rules may include conversion from the first exchange currency to the target exchange preferred currency. In another example of achieving compliance with currency-related target exchange governing rules, a rate of exchange, a process for currency exchange (e.g., conversion through an intermediate currency), and the like may be performed during token conversion.

Conversion to a target exchange token may include generating one or more smart contracts based on a combination of source exchange token characteristics (as may be harvested and/or derived as described herein), such as for presentation of the item in the second exchange.

Conversion to a target exchange token may include execution of a smart contract associated with at least one of the item, the source/first exchange, and the target exchange. Such a token conversion smart contract may be configured with terms that provide a degree of control on a token conversion process. An example token conversion smart contract term may be for facilitating harvesting of item characteristics from a source token, such as limiting access to item characteristics based on legal jurisdiction of on one or more of the source and target exchanges. In this example, information that may describe characteristics of an item in a first exchange may require export clearance before being presented in an exchange outside of a jurisdiction of the first exchange. A smart contract that may facilitate and/or control aspects of token item characteristic harvesting and/or conversion may dictate which information requires export clearance, and one or more ways by which such clearance is to be obtained. A smart contract may identify how such information is to be handled, processed, stored, transferred, and the like, including without limitation preventing access to the relevant characteristics information for services and the like that enable export of information, such as services that may facilitate conversion of item characteristics from a first jurisdiction to a second restricted jurisdiction, and the like.

Token Generation from Items and Smart Contract

Referring to FIG. 248, embodiments of methods and systems for generating tokens (and optional corresponding smart contracts) that are representative of one or items based at least in part on characteristics of the items and one or more corresponding smart contracts are depicted. More specifically, embodiments for methods and systems of robotic process automation-based token generation are depicted. In example embodiments, token (and optionally item smart contract) generation for representation of an item in a second exchange may be based on characteristics of the item determined from data extracted from an item 24905 and optionally from a smart contract 24806 of an item from a first (e.g., different) exchange. The embodiments depicted in FIG. 248 may include a first exchange X 24902 that includes and/or makes use of item 24905 and item smart contracts 24906 from which at least item characteristics are determined for token generation, e.g., via token generation system 24912 that may produce a target exchange item token 24914 and optional target exchange item smart contract 24916 for exchange y 24904. At least one objective of such a system may be to configure a robotic process automation system to harvest item characteristics from an item and contract terms from a smart contract for the item that is available in a first exchange; process those characteristics and terms; and produce a target exchange item token 24914 (and optionally a companion target exchange item smart contract 24916) that is useful in representing the item in a target exchange, such as exchange Y 24904.

In example embodiments, an item of a source exchange 24902 is identified, such as by designation through a user interface, automatically, semi-automatically, and the like. Generally independent of a means by which an item is identified for representative token generation, given that an item is identified, a robotic process automation process may automate collection of characteristics of the item from the item 24905 of the first exchange 24902. Further a smart contact 24906 associated with the item 24905 may be identified and processed (e.g., through a smart contract parsing system 24918) to produce one or more smart contract terms associated with the item 24905. The token generation system 24912 may process the item 24905 to determine information that is descriptive and/or contains characteristics to be used at least for generating a target exchange item-representative token 24914.

In an example, a first exchange 24902 may provide and/or make available a directory (e.g., list and the like) of items 24905 and corresponding smart contracts 24906 for items in the exchange. The list may include and/or reference a set of characteristics of the item 24905, such as identifying characteristics, physical characteristics, ownership characteristics, performance/service characteristics, pricing and sales terms characteristics, and the like. Therefore, in an example of representative item token generation, a token generation system 24912, optionally through operation of a robotic process automation system 24910, may process characteristics of an identified item 24905 and generate one or more target item representative tokens 24914 for a second/target exchange.

The smart contract parsing system 24918 may facilitate conversion of item-specific contract terms into a set of smart contract terms suitable for use by the token generation system 24912 to produce at least a corresponding target exchange item-specific smart contract 24916. An item smart contract 24906 may contain and/or reference a wide range of contract terms associated with an item of an exchange. Some of the terms may characterize the item; some may characterize a context of the exchange that is pertinent to the item, others may be indicative of seller terms, broker terms, use and other conditions, and the like. The smart contract parsing system 24918 may facilitate parsing a source smart contract 24906 content to distinguish among the potentially many types of content and/or terms, only some of which may be pertinent to target exchange item representative token and companion smart contract generation. In example embodiments, smart contract terms of a source exchange in an item smart contract 24906 may not be pertinent to generating a target exchange smart contract for the item and therefore may be effectively filtered by use of the smart contract parsing system 24918. The smart contract parsing system 24918 may reference a set of types of contract terms that may be associated with different target exchanges. The smart contract parsing system 24918 may identify for retrieval and for processing a portion of the set of contract term types that are associated with the target exchange (exchange Y 24904 in the embodiments of FIG. 248). In example embodiments, robotic process automation services 24910 may facilitate automated execution of this aspect of token and contract generation for configuring an instance of the token generation system 24912 for generating a target exchange item-representative token (and optional smart contract) for a target exchange 24904 from an item-associated smart contract 24906 of a source exchange 24902.

The token generation system 24912 may process one or more item characteristics (e.g., characteristics of an item retrieved from an item 24905 of a first exchange 24902) along with contract terms of the corresponding item smart contract 24906 for generating a target exchange item token 24914 and smart contract. This processing may further rely on characteristics rules 24908 of a target exchange (e.g., exchange Y 24904 in the embodiments of FIG. 248). Target exchanges may maintain the set of characteristics rules 24908 to facilitate, among other things, representing an item based on item characteristics, and optionally for use and/or understanding of item characteristics. The token generation system 24912 may query one or more control facilities, such as an exchange control tower of a target exchange to retrieve characteristics rules that are pertinent to token generation.

An example of use of characteristics rules by a token generation system 24912 may include minimum quantity characteristics. A smart contract term harvested from or based on a first exchange item smart contract 24906 may indicate that a minimum transaction quantity of the item in a transaction is based on item count (e.g., a single item). A minimum transaction quantity-associated characteristic rule for a target exchange may require that a minimum transaction quantity of an item in the target exchange be based on transaction amount. Therefore, taking into consideration item unit cost, when applying this example target exchange minimum transaction quantity rule, a contract term of target exchange item smart contract 24916 may indicate that a minimum item count for a transaction to be represented by the generated target exchange item token 24914 be based on transaction amount, which may be greater than a single item.

The token generation system 24912 may rely on (e.g., interact with) a smart contract engine 24920 when processing at least contract terms of the source item smart contract 24906. The smart contract engine 24920 may generate and/or validate (e.g., through simulation and the like) at terms for the target exchange smart contract 24916 that comply with smart contract best practices and with target exchange characteristics rules 24908. As an example, if physical units designated in a target exchange characteristics set of rules 24908 indicate such units are to be metric units, the smart contract engine 24920 may create terms and/or conditions associated with the target exchange generated item-representative token 24914 that are expressed in metric terms. The resulting smart contract 24916 may indicate that a deployment of the item must be on a surface that stably supports the weight of the item, which would require use of metric units (e.g., metric tons) as a criteria for meeting smart contract compliance of this item installation-related term. IN this way the target exchange smart contract 24916 term directly relates to a characteristic of the item (e.g., a metric weight of the item) included in the item-representative target exchange token 24914.

A generated target exchange item token 24914 that is representative of the item may be encoded with the item characteristics. Characteristics of an item that indicate physical aspects of the item may be encoded as displayable elements in the token (e.g., color, general shape, relative size, and the like). Characteristics that are time-related (e.g., expiration date, automatic renewal date, best-by date, offer validity timeframe, changes in characteristics over time, and the like) may be encoded as terms and/or conditions of a corresponding smart contract. Characteristics that are value related (e.g., purchase costs, operating costs, residual fees, return fees, finance fees, and the like) may be encoded in the token. In example embodiments, a generated item token 24914 may reference a companion smart contract 24916. The contract terms of the smart contract 24906, processed (e.g., by the smart contract parsing system 24918) and adjusted as needed based on exchange rules 24908 (e.g., by the smart contract engine 24920) may be output to a target exchange item-specific smart contract 24916 that is linked to a generated token 24914.

In example embodiments, the methods and systems of FIG. 248 for contract term harvesting and target exchange token (and optional smart contract) generation may be performed by a robotic process automation service 24910 that may be trained on a set of token and smart contract generation actions, such as actions taken by humans, the token generation system 24912, the smart contract engine 24920, the smart contract parsing system 24918, and the like. Robotic process automation services 24910 may facilitate autonomous generation of representative tokens based on item characteristics of an item of a source exchange for use in a target exchange. Robotic process automation services 24910, when combined with the token generation system 24912 capabilities and processing systems may automate generation of a plurality of target exchange item-representative tokens 24914 and target exchange item-specific smart contracts 24916.

Rights Token Generation

Referring to FIG. 249, embodiments of methods and systems for generating rights tokens (and optional corresponding smart contracts) that are representative of a set of rights relating to an item based at least in part on one or more of a smart contract of an item, or a set of terms and conditions of the item are depicted.

In example embodiments, rights token generation system 24064 may receive item-related smart contract information (e.g., via a smart contract processing system 24058 and the like that may generate and/or provide a set of smart contract parameters) and/or item-related terms and conditions (e.g., via a terms and condition analysis system 24066 and the like that may generate and/or provide a set of item-related terms and conditions) and produce, among other things, an item rights token 24068 that may be based at least in part on a target exchange set of governing rules 24062.

In example embodiments, rights related to an item 24052 that may be encoded into a generated item rights token 24068 may include, without limitation ownership rights, transaction dispositive (e.g., last right of refusal) rights, item use rights, item naming rights, item commercialization rights and the like. Ownership rights may include rights provided to an owner(s) of the item (e.g., a party who owns at least a portion of the item). Ownership rights may include rights provided with the item (e.g., rights to adapt the item, rights to reproduce the item, rights to an easement such as access to a parking space, and the like). Item related rights that may be transaction dispositive may include rights to set a minimum sale price, rights to set restrictions on buyer financial risk, and the like. Item related use rights may include, without limitation, rights to use an item for a limited duration, during a specific time frame, rights to cause normal wear and tear on the item, jurisdictional restrictions of use, and the like. Item commercialization rights may include rights to rent, lease, or otherwise license access to, use of, and resale of the item, use of the item for promotional purposes, and the like. Item naming rights may include rights to determine, such as for publication, promotion, and identification purposes a name of the item (e.g., rights to make a sports arena/stadium for a duration of time, such as for a calendar year and the like.

The rights token generation system 24064 may rely on a smart contract processing system 24058 to parse, decode, process (e.g., execute), or otherwise identify rights granted through and/or controlled by the smart contract for parties related to the item, such as a buyer, seller, curator, and the like. As an example, an item smart contract 24054 may indicate that a party may sell his/her share of the item; however a process for selling called out by the smart contract may indicate that the owned portion shall first be offered to one or more of the other owners/partial owners, who may have a first right of refusal, and the like. The smart contract processing system 24058 may determine if an item is controlled by a smart contract and may automatically process the smart contract to identify rights associated therewith. The smart contract processing system 24058 may also determine if an item has a reporting relationship with the smart contract, such as if the item is required to report into the smart contract. In a non-limiting example the item may be an electronic item (and/or may be monitored by an electronic monitoring device) that may be required to report activity to a smart contract associated with monetization by an exchange in which it is listed, and the like.

In example embodiments, an item for which a rights token may be generated, such as item 24052, may be associated with (e.g., may include) a set of terms and/or conditions 24056 that may identify, influence, or otherwise impact generation of a rights token for the item. Although these terms and conditions 24056 may not include explicit terms and conditions for rights, they may indicate certain factors that may impact generating an item rights token 24068. In an example, a condition associated with the item 24052 may include limits on operating the item in a residential neighborhood after dark. Such a condition may be analyzed by the terms and conditions analysis system 24066 that may produce a set of data regarding this condition that the right token generation system 24064 may convert into a limit on a set of use rights, such as rights to use (e.g., operate) the item include only daytime use.

In example embodiments, the rights token generation system 24064 may consult a set of target exchange governing rules 24062 when generating an item rights token 24068 for the target exchange. Sample target exchange governing rules are now described; however a more detailed description of target exchange governing rules and their impact on rights token generation may be found in the description associated with FIG. 250. Governing rules of the exchange may include exchange-specific rules, such as exchange transaction timing (e.g., settlement dwell time and the like), record keeping (e.g., use of a distributed ledger), rules associated with a platform through which the target exchange operates, and the like. Other sample target exchange governing rules 24062 may include transaction-specific rules, such as exchange of physical items may provide rights to a smart contract of the target exchange to monitor conditions of sale of items transacted through the exchange. A target exchange governing rule that may relate to item rights token generation may include minimum use durations (e.g., a minimum calendar time must lapse before the item can be re-transacted). Commercialization rights may be impacted by a set of target exchange governing rules 24062, such as requiring that resale of the item occur through the target exchange unless a fee (e.g., buyer resale release fee) is paid to the exchange, and the like.

In example embodiments, other example target exchange governing rules 24062 may include transactor and/or transactor-type rules. As an example, a set of item rights for an item rights token 24068 may be impacted by a liquidity of a transactor, such as a buyer and/or seller in a transaction for an item. A target exchange may retain a degree of ownership rights when a liquidity of a buyer is below a threshold. In such a case a smart contract may optionally be configured to update the degree of exchange ownership throughout a probation period after completion of a transaction for the item by the buyer.

In example embodiments, the methods and systems of FIG. 249 for rights token (and optional smart contract) generation may be performed by a robotic process automation service 24060 that may be trained on a set of rights token generation actions, such as actions taken by humans, the rights token generation system 24064, the smart contract processing system 24058, the terms and conditions analysis system 24066, and the like. Robotic process automation services 24060 may facilitate autonomous generation of rights tokens based on rights of an item in a source exchange for use in a target exchange. Robotic process automation services 24060, when combined with the rights token generation system 24064 capabilities may automate generation of a plurality of item rights tokens 24068 based on item terms and conditions 24056, item smart contract 24054, and target exchange governing rules 24062.

Rights Token Generation with Target Exchange Rules Details

Referring to FIG. 250, embodiments of methods and systems for generating item rights tokens that are representative of a set of rights relating to an item based at least in part on one or more of a smart contract of an item, a set of terms and conditions of the item, and a multi-dimensional set of target exchange governing rules are depicted.

In example embodiments, rights token generation system 24164 may receive item-related smart contract information (e.g., via a smart contract processing system 24158 and the like that may generate and/or provide a set of smart contract parameters) and/or item-related terms and conditions (e.g., via a terms and condition analysis system 24166 and the like that may generate and/or provide a set of item-related terms and conditions) and produce, among other things, an item rights token 24168 that may be based at least in part on a target exchange set of multi-dimensional governing rules 24162.

In example embodiments, rights related to an item 24152 that may be encoded into a generated item rights token 24168 may include, without limitation ownership rights, transaction dispositive (e.g., last right of refusal) rights, item use rights, item naming rights, item commercialization rights and the like. Ownership rights may include rights provided to an owner(s) of the item (e.g., a party who owns at least a portion of the item). Ownership rights may include rights provided with the item (e.g., rights to adapt the item, rights to reproduce the item, rights to an easement such as access to a parking space, and the like). Item related rights that may be transaction dispositive may include rights to set a minimum sale price, rights to set restrictions on buyer financial risk, and the like. Item related use rights may include, without limitation, rights to use an item for a limited duration, during a specific time frame, rights to cause normal wear and tear on the item, jurisdictional restrictions of use, and the like. Item commercialization rights may include rights to rent, lease, or otherwise license access to, use of, and resale of the item, use of the item for promotional purposes, and the like. Item naming rights may include rights to determine, such as for publication, promotion, and identification purposes a name of the item (e.g., rights to make a sports arena/stadium for a duration of time, such as for a calendar year and the like.

The rights token generation system 24164 may rely on a smart contract processing system 24158 to parse, decode, process (e.g., execute), or otherwise identify rights granted through and/or controlled by the smart contract for parties related to the item, such as a buyer, seller, curator, and the like. As an example, an item smart contract 24154 may indicate that a party may sell his/her share of the item; however a process for selling called out by the smart contract may indicate that the owned portion shall first be offered to one or more of the other owners/partial owners, who may have a first right of refusal, and the like. The smart contract processing system 24158 may determine if an item is controlled by a smart contract and may automatically process the smart contract to identify rights associated therewith. The smart contract processing system 24158 may also determine if an item has a reporting relationship with the smart contract, such as if the item is required to report into the smart contract. In a non-limiting example the item may be an electronic item (and/or may be monitored by an electronic monitoring device) that may be required to report activity to a smart contract associated with monetization by an exchange in which it is listed, and the like.

In example embodiments, an item for which a rights token may be generated, such as item 24152, may be associated with (e.g., may include) a set of terms and/or conditions 24156 that may identify, influence, or otherwise impact generation of a rights token for the item. Although these terms and conditions 24156 may not include explicit terms and conditions for rights, they may indicate certain factors that may impact generating an item rights token 24168. In an example, a condition associated with the item 24152 may include limits on operating the item in a residential neighborhood after dark. Such a condition may be analyzed by the terms and conditions analysis system 24166 that may produce a set of data regarding this condition that the right token generation system 24164 may convert into a limit on a set of use rights, such as rights to use (e.g., operate) the item include only daytime use.

In example embodiments, the rights token generation system 24164 may consult a multi-dimensional set of target exchange governing rules 24162 when generating an item rights token 24168 for use in a target exchange. Target exchange governing rules 24162 may include a plurality of dimensions and/or type of governing rules including, without limitation, jurisdiction rules 24170, item industry rights standards 24172, rights token templates 24174 and the like.

Jurisdiction governing rules 24170 may impact right token generation system 24164, such as by setting constraints on one or more rights associated with the item. As an example, an item may be permitted to be owned and transacted by a non-citizen in a first jurisdiction; however, the item may not be permitted to be owned by a non-citizen in a jurisdiction of a target exchange in which the item rights token 24168 is to be used. For a non-citizen to acquire the item in a jurisdiction of the target exchange, ownership rights may have to be shared with a legal entity formed in the target exchange jurisdiction, and the like. Jurisdiction rules 24170 that may be consulted by the rights token generation system 24164 may include age limits for items that may be different than those found in a set of item terms and conditions 24156, for example. The rights token generation system 24164 may receive item terms and conditions 24156 that may indicate only users above age 18 can operate the item. However, when this age-related condition is evaluated against a target jurisdiction age rule for the item, the resulting item rights token 24168 may limit operation to users above age 20 or may permit operation by users as young as 16 years.

Another type of target exchange governing rule 24162 may include item industry rights standards 24172 that may include a set of standards developed for an industry of the item for guiding selection and/or generation of item rights. In an example of a livestock industry, a set of industry rights standards 24172 may include guidelines for rights of third-parties to perform inspection, use rights for different classes of livestock (e.g., goats versus Clydesdales), and the like. The industry rights standards 24172 may be relied up by the rights token generation system 24164 to facilitate adapting rights detected through smart contract processing 24158 and/or through terms and condition analysis 24166. If a right determined by the smart contract processing system 24158 presents a conflict with an industry rights standard 24172, the rights token generation system 24164 may adapt the incoming smart-contract determined right to be compliant with the industry standard rights 24172.

Another type or dimension of target exchange governing rules 24162 may include rights token templates 24174. A target exchange may publish a set of rights token templates for ensuring compliance with any applicable governing rules, such as jurisdiction rules 24170, industry rights standards 24172, and the like. A set of rights templates 24174 may include exchange-based rights templates that may include a minimum set of rights for items transacted in the exchange. A set of rights templates 24174 may include templates and/or configure one or more templates to include industry group rights standards, regulatory-based rights, and the like. In example embodiments, exchanges may establish rights token templates to facilitate differentiation from other exchanges, such as to provide a way for item owners to identify benefits of engaging with one exchange or another, for example.

In example embodiments, the methods and systems of FIG. 250 for rights token (and optional smart contract) generation may be performed by a robotic process automation service 24160 that may be trained on a set of rights token generation actions, such as actions taken by humans, the rights token generation system 24164, the smart contract processing system 24158, the terms and conditions analysis system 24166, and the like. Robotic process automation services 24160 may facilitate autonomous generation of rights tokens based on rights of an item in a source exchange for use in a target exchange. Robotic process automation services 24160, when combined with the rights token generation system 24164 capabilities may automate generation of a plurality of item rights tokens 24168 based on item terms and conditions 24156, item smart contract 24154, and target exchange governing rules 24162.

Rights Token Generation with Rights Conformance Evaluation

Referring to FIG. 251, embodiments of methods and systems for generating item rights tokens that are representative of a set of rights relating to an item based at least in part on one or more of a smart contract of an item, a set of terms and conditions of the item, and that are compliant with one or more target exchange governing rules are depicted.

In example embodiments, rights conformance evaluation system 24270 may receive item-related smart contract information (e.g., via a smart contract processing system 24258 and the like that may generate and/or provide a set of smart contract parameters) and/or item-related terms and conditions (e.g., via a terms and condition analysis system 24266 and the like that may generate and/or provide a set of item-related terms and conditions) and produce, among other things, a set of conforming rights 24274 and optionally a set of non-conforming rights 24272 based at least in part on a target exchange set of governing rules 24262. In example embodiments, the rights conformance evaluation system 24270 may determine, for one or more rights received if it conflicts with a corresponding target exchange governing rule 24262. The rights conformance evaluation system 24270 may determine that a right received is a non-confirming right 24272, a conforming right 24274, or that conformance is not dispositive through the evaluation. In example embodiments, rights that determined to be other than non-conforming may be deemed to be conforming.

The rights conformance evaluation system 24270 may rely on a smart contract processing system 24258 to parse, decode, process (e.g., execute), or otherwise identify rights granted through and/or controlled by the smart contract for parties related to the item, such as a buyer, seller, curator, and the like. As an example, an item smart contract 24254 may indicate that a party may sell his/her share of the item; however a process for selling called out by the smart contract may indicate that the owned portion shall first be offered to one or more of the other owners/partial owners, who may have a first right of refusal, and the like. The smart contract processing system 24258 may determine if an item is controlled by a smart contract and may automatically process the smart contract to identify rights associated therewith. The smart contract processing system 24258 may also determine if an item has a reporting relationship with the smart contract, such as if the item is required to report into the smart contract. In a non-limiting example the item may be an electronic item (and/or may be monitored by an electronic monitoring device) that may be required to report activity to a smart contract associated with monetization by an exchange in which it is listed, and the like. Item smart contract-derived rights may establish ownership rights that may conflict with target exchange governing rules 24262. An example ownership right conflict may include a smart contract assigning rights to revenues resulting from the use of the item to a third party, whereas the target exchange governing rules 24262 require such rights to revenues be determined by the acquiring owner of the item.

In example embodiments, an item for which a rights token may be generated, such as item 24252, may be associated with (e.g., may include) a set of terms and/or conditions 24256 that may identify, influence, or otherwise impact generation of a rights token for the item. Although these terms and conditions 24256 may not include explicit terms and conditions for rights, they may indicate certain factors that may impact generating an item rights token 24268. In an example, a condition associated with the item 24252 may include limits on operating the item in a residential neighborhood after dark. Such a condition may be analyzed by the terms and conditions analysis system 24266 that may produce a set of data regarding this condition that the rights conformance evaluation system 24270 may evaluate against a corresponding target exchange governing rule 24262. If this set of data is indicative of a conforming right 24274, the right token generation system 24264 may convert it into a limit on a set of use rights, such as rights to use (e.g., operate) the item include only daytime use.

The rights conformance evaluation system 24270 may rely on an item terms and condition processing system 24266 to parse, decode, analyze, or otherwise identify rights associated with the item for parties related to the item, such as a buyer, seller, curator, and the like. An example of conflicting rights determined from analysis of item terms and conditions 24256 may include a right to own the item without formal registration of the item with a regulatory party (e.g., a firearm) that may conflict with a set of target exchange governing rules 24262 that require registration. The rights conformance evaluation system 24270 may flag this item right as a non-conforming right 24272.

In example embodiments, rights related to an item 24252 that are deemed to be conforming rights 24274 may be encoded into a generated item rights token 24268 and may include, without limitation ownership rights, transaction dispositive (e.g., last right of refusal) rights, item use rights, item naming rights, item commercialization rights and the like. Ownership rights may include rights provided to an owner(s) of the item (e.g., a party who owns at least a portion of the item). Ownership rights may include rights provided with the item (e.g., rights to adapt the item, rights to reproduce the item, rights to an easement such as access to a parking space, and the like). Item related rights that may be transaction dispositive may include rights to set a minimum sale price, rights to set restrictions on buyer financial risk, and the like. Item related use rights may include, without limitation, rights to use an item for a limited duration, during a specific time frame, rights to cause normal wear and tear on the item, jurisdictional restrictions of use, and the like. Item commercialization rights may include rights to rent, lease, or otherwise license access to, use of, and resale of the item, use of the item for promotional purposes, and the like. Item naming rights may include rights to determine, such as for publication, promotion, and identification purposes a name of the item (e.g., rights to make a sports arena/stadium for a duration of time, such as for a calendar year and the like.

In example embodiments, the methods and systems of FIG. 251 for rights conformance evaluation may be performed by a robotic process automation service 24260 that may be trained on a set of rights conformance evaluation actions, such as actions taken by humans, the rights conformance evaluation system 24270, the smart contract processing system 24258, the terms and conditions analysis system 24266, and the like. Robotic process automation services 24260 may facilitate autonomous evaluation of rights conformance and generation of rights tokens based on rights of an item in a source exchange for use in a target exchange. Robotic process automation services 24260, when combined with the rights conformance evaluation system 24270 and rights token generation system 24264 capabilities may automate rights conformance evaluation and rights token generation based on item terms and conditions 24256, item smart contract 24254, and target exchange governing rules 24262.

Rights Token Generation and Adaptable Rights Tokens

Referring to FIG. 252, embodiments of methods and systems for generating adaptable rights tokens that are representative of a set of rights relating to an item based at least in part on one or more of a smart contract of an item, a set of terms and conditions of the item, target exchange governance rules, and adaptation factors are depicted.

In example embodiments, adaptable rights token generation system 24364 may receive item-related smart contract information (e.g., via a smart contract processing system 24358 and the like that may generate and/or provide a set of smart contract parameters) and/or item-related terms and conditions (e.g., via a terms and condition analysis system 24366 and the like that may generate and/or provide a set of item-related terms and conditions) and produce, among other things, an adaptable item rights token 24368 that may be based at least in part on a target exchange set of governing rules 24362.

In example embodiments, rights related to an item 24352 that may be encoded into a generated adaptable item rights token 24368 may include, without limitation ownership rights, transaction dispositive (e.g., last right of refusal) rights, item use rights, item naming rights, item commercialization rights and the like. Ownership rights may include rights provided to an owner(s) of the item (e.g., a party who owns at least a portion of the item). Ownership rights may include rights provided with the item (e.g., rights to adapt the item, rights to reproduce the item, rights to an easement such as access to a parking space, and the like). Item related rights that may be transaction dispositive may include rights to set a minimum sale price, rights to set restrictions on buyer financial risk, and the like. Item related use rights may include, without limitation, rights to use an item for a limited duration, during a specific time frame, rights to cause normal wear and tear on the item, jurisdictional restrictions of use, and the like. Item commercialization rights may include rights to rent, lease, or otherwise license access to, use of, and resale of the item, use of the item for promotional purposes, and the like. Item naming rights may include rights to determine, such as for publication, promotion, and identification purposes a name of the item (e.g., rights to make a sports arena/stadium for a duration of time, such as for a calendar year and the like.

The adaptable rights token generation system 24364 may rely on a smart contract processing system 24358 to parse, decode, process (e.g., execute), or otherwise identify rights granted through and/or controlled by the smart contract for parties related to the item, such as a buyer, seller, curator, and the like. As an example, an item smart contract 24354 may indicate that a party may sell his/her share of the item; however a process for selling called out by the smart contract may indicate that the owned portion shall first be offered to one or more of the other owners/partial owners, who may have a first right of refusal, and the like. The smart contract processing system 24358 may determine if an item is controlled by a smart contract and may automatically process the smart contract to identify rights associated therewith. The smart contract processing system 24358 may also determine if an item has a reporting relationship with the smart contract, such as if the item is required to report into the smart contract. In a non-limiting example the item may be an electronic item (and/or may be monitored by an electronic monitoring device) that may be required to report activity to a smart contract associated with monetization by an exchange in which it is listed, and the like.

In example embodiments, an item for which an adaptable rights token may be generated, such as item 24352, may be associated with (e.g., may include) a set of terms and/or conditions 24356 that may identify, influence, or otherwise impact generation of an adaptable rights token for the item. Although these terms and conditions 24356 may not include explicit terms and conditions for rights, they may indicate certain factors that may impact generating an adaptable item rights token 24368. In an example, a condition associated with the item 24352 may include limits on operating the item in a residential neighborhood after dark. Such a condition may be analyzed by the terms and conditions analysis system 24366 that may produce a set of data regarding this condition that the adaptable right token generation system 24364 may convert into a limit on a set of use rights, such as rights to use (e.g., operate) the item include only daytime use.

In example embodiments, the adaptable rights token generation system 24364 may consult a set of target exchange governing rules 24362 when generating an adaptable item rights token 24368 for the target exchange. Sample target exchange governing rules may include exchange-specific rules, such as exchange transaction timing (e.g., settlement dwell time and the like), record keeping (e.g., use of a distributed ledger), rules associated with a platform through which the target exchange operates, and the like. Other sample target exchange governing rules 24062 may include transaction-specific rules, such as exchange of physical items may provide rights to a smart contract of the target exchange to monitor conditions of sale of items transacted through the exchange. A target exchange governing rule that may relate to adaptable item rights token generation may include minimum use durations (e.g., a minimum calendar time must lapse before the item can be re-transacted). Commercialization rights may be impacted by a set of target exchange governing rules 24362, such as requiring that resale of the item occur through the target exchange unless a fee (e.g., buyer resale release fee) is paid to the exchange, and the like.

In example embodiments, other example target exchange governing rules 24362 may include transactor and/or transactor-type rules. As an example, a set of item rights for an adaptable item rights token 24368 may be impacted by a liquidity of a transactor, such as a buyer and/or seller in a transaction for an item. A target exchange may retain a degree of ownership rights when a liquidity of a buyer is below a threshold. In such a case a smart contract may optionally be configured to update the degree of exchange ownership throughout a probation period after completion of a transaction for the item by the buyer.

In example embodiments, adaptation of an adaptable item rights token 24368 may be based on a set of target exchange adaptation rules 24372, data associated with a transactor participant accessing the adaptable rights token 24368 and the like. A rights token adaptation system 24370 may, responsive to a request by an exchange participant (e.g., a transactor) 24376, adapt one or more aspects of the adaptable rights token 24368 to produce at least one transactor-specific item rights token 24374. The set of target exchange adaptation rules 24372 may include rules that define adaptation limits and criteria for certain rights, such as ownership rights, resale rights, use rights, and the like. An example target exchange adaptation rule 24372 may include constraints on how a right to use an item (e.g., a facility) may be adapted based on aspects of the transactor/buyer of the item. A right to use provided in an adaptable rights token for the item may be adapted based on an entity type of the transactor. Use rights for a non-profit type entity transactor may be adapted based on regulations for use of a facility by a non-profit entity. The rights token adaptation system 24370 may capture a request 24378 for the adaptable rights token 24368 corresponding to the facility from a non-profit exchange transactor 24376. Based on rules for facility use by a non-profit entity that may be provided by the target exchange adaptation rules data set 24372, the rights token adaptation system 24370 may generate a non-profit transactor-specific rights token 24374.

An adaptable item rights token generation and use system as depicted in FIG. 252 may facilitate per-use rights adaptation to suit a range of target exchange-specific rights constraints, participant-specific rights, and the like. In example embodiments, per-use rights adaptation of an adaptable item rights token 24368 may include generating a plurality of differentiated rights tokens for a plurality of differentiated transactors from a common set of adaptable item rights as may be captured by an adaptable item rights token 24368. Such per-use adaptation may also facilitate modeling of transactor-specific rights for items in different target exchanges. Application (e.g., in an off-line/sandbox/emulation mode) of a candidate set of exchange adaptation rules 24372 for a candidate target exchange to transactor-specific request data by the rights token adaptation system 24370 may facilitate predicting a set of data descriptive of a corresponding transactor-specific rights token 24374. Through use of a robotic process automation system 24360, a plurality of such transactor-specific rights token data sets may be generated and optionally presented to a transactor for evaluating which of a plurality of target exchanges provide the transactor with rights that align with, for example, a set of business goals of the transactor.

In example embodiments, the methods and systems of FIG. 252 for adaptable rights token generation may be performed by a robotic process automation service 24360 that may be trained on a set of adaptable rights token generation actions, such as actions taken by humans, the adaptable rights token generation system 24364, the smart contract processing system 24358, the terms and conditions analysis system 24366, a rights token adaptation system 24370, and the like. Robotic process automation services 24360 may facilitate autonomous generation of adaptable rights tokens based on rights of an item in a source exchange for use in a target exchange. Robotic process automation services 24360, when combined with the adaptable rights token generation system 24364 capabilities may automate generation of a plurality of adaptable item rights tokens 24368 based on item terms and conditions 24356, item smart contract 24354, and target exchange governing rules 24362, and the like.

Automated Orchestration of Exchanges with Cross-Exchange Action Responsiveness

In embodiments, provided herein are computer-implemented methods and systems for automated orchestration of one or more marketplaces. Automated orchestration may include cross-exchange workflow initiation associated with value normalization, value translation, item token generation, rights token generation and the like. In an example, such methods and systems may have a set of robotic process automation services that are configured to orchestrate a set of transaction workflows in each of a plurality of exchanges, such that initiation of a set of actions in one exchange automatically results in the triggering of a set of actions in at least one other exchange. In example embodiments, orchestration of the set of transaction workflows in each of the plurality of exchanges may initiate a set of actions in the set of transaction workflows that causes and/or contributes to initiation of one of the set of workflows in one exchange automatically results in the triggering of a set of corresponding/coordinating/item-centric actions that result in activating at least one of a corresponding set of workflows in the other exchange.

Referring to FIG. 253, a set of robotic process automation services 24460 may be applied to sets of workflows for a plurality of exchanges, such as exchange X 24452, exchange Y 24454, and exchange Z 24456. The set of robotic process automation services 24460 may facilitate automating one or more workflows 24458 of the exchanges.

Actions of a first exchange, such as actions 24462 of exchange X 24452 may include a first action XA1 24464. The first action 24464 may be selected from a set of actions 24466 including, without limitation normalization of item values within the first exchange, translation of value of an item from/to the first exchange to/from a second exchange, generation of an item token, generation of a rights token, and other actions. Initiation of the first action 24464 may trigger, cause, or contribute to initiation of at least one action in the second exchange. In example embodiments, initiation of the first action 24464 in exchange X 24452 may trigger activation of a set of actions 24468 in exchange Y 24454. The set of actions 24468 in exchange Y 24454 may include an action of a workflow of exchange Y, such as workflow Y WF 1 and/or workflow Y WF 2. The set of actions 24468 in exchange Y 24454 may include an action selected from a list of actions including value normalization, value translation, item token generation, rights token generation, and other actions.

Further, initiation of action XA1 24464 (a first action) in exchange X 24452 (a first exchange) may trigger initiation of action ZAn 24470 (a third action) in exchange Z 24456 (a third exchange). In this example, the first action (an action to normalize a value of an item) in the first exchange, may trigger activation of a value translation action (third action) in the third exchange.

In embodiments, methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to orchestrate a set of transaction workflows in each of a plurality of exchanges, such that initiation of a set of actions in the set of transaction workflows that causes/contributes to initiation of one of the set of workflows in one exchange automatically results in the triggering of a set of corresponding/coordinating/item-centric actions that result in activating at least one of a corresponding set of workflows in at least one other exchange.

In embodiments, methods and systems are provided having a set of robotic process automation services that are configured to automatically translate the value of an item represented in a first exchange into a value of the item for representation in a second exchange and having a set of robotic process automation services that are configured to orchestrate a set of transaction workflows in each of a plurality of exchanges, such that initiation of a set of actions in the set of transaction workflows that causes/contributes to initiation of one of the set of workflows in one exchange automatically results in the triggering of a set of corresponding/coordinating/item-centric actions that result in activating at least one of a corresponding set of workflows in at least one other exchange.

In embodiments, methods and systems are provided having a set of robotic process automation services that are configured to generate token that represents an item in an exchange based on characteristics of the item determined from data from a different exchange and having a set of robotic process automation services that are configured to orchestrate a set of transaction workflows in each of a plurality of exchanges, such that initiation of a set of actions in the set of transaction workflows that causes/contributes to initiation of one of the set of workflows in one exchange automatically results in the triggering of a set of corresponding/coordinating/item-centric actions that result in activating at least one of a corresponding set of workflows in at least one other exchange.

In embodiments, methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of robotic process automation services that are configured to orchestrate a set of transaction workflows in each of a plurality of exchanges, such that initiation of a set of actions in the set of transaction workflows that causes/contributes to initiation of one of the set of workflows in one exchange automatically results in the triggering of a set of corresponding/coordinating/item-centric actions that result in activating at least one of a corresponding set of workflows in at least one other exchange.

In example embodiments, the methods and systems of FIG. 253 for automatic triggering of actions across exchanges may be performed by a robotic process automation service 24460 that may be trained on a set of cross exchange workflow triggering actions, such as actions taken by humans, a cross-exchange action triggering facility, and the like. Robotic process automation services 24460 may facilitate autonomous configuration of links among transaction workflows, workflow actions, and exchange actions that enable actions in a first exchange automatically triggering actions in a second exchange. Robotic process automation services 24460 may facilitate automatically triggering one or more actions in one or more workflows for one or more exchanges for a set of transaction workflows across a plurality of exchanges.

Exchange Actions in a First Exchange May Initiate Workflows and/or Initiate Exchange Actions in a Second Exchange Referring to FIG. 254, a set of robotic process automation services may be configured to orchestrate a set of transaction workflows in each of a plurality of exchanges, such that initiation of a set of actions in a first exchange that causes initiation of a first transaction workflow of the set of transaction workflows of the first exchange may automatically result in the triggering of initiation of a set of corresponding actions in at least one other exchange, wherein the set of corresponding actions in the at least one other exchange cause initiation of a second transaction workflow of the set of transaction workflows of the at least one other exchange.

In example embodiments, a robotic process automation service 24560 may be configured to orchestrate a set of transaction workflows 24558 in each of a plurality of exchanges, such as exchange X 24552, exchange Y 24554, and exchange Z 24556. The set of transaction workflows 24558 may include one or more workflows of exchange X 24552, such as X WF 1 and X WF 2 as depicted in FIG. 254. The set of transaction workflows 24558 may include workflows in exchange Y 24554 (workflows Y WF 1 and Y WF 2), and may include workflows in exchange Z 24556 (workflows Y WF 1 and Y WF 2).

Exchange X 24552 may also include a set of actions 24562, such as action XA1 24564 that may trigger workflow X WF 1 in the set of transaction workflows 24558. The set of actions 24562 may also include action XA11 that may automatically trigger a corresponding action YA1 in a set of actions of exchange Y 24554. Action YA1 may initiate, within exchange Y a workflow 24568 in the set of transaction workflows 24558. Further Exchange X 24552 may include a third action XA12 in the set of actions 24562 that may automatically trigger an action ZAn 24570 in exchange X 24556, wherein action ZAn 24570 may be outside of the set of transaction workflows 24558.

The set of transaction workflows 24558 may include a plurality of workflows for achieving cross-exchange item handling as described herein, that may be selected form a set of workflows 24566 including without limitation one or more of an item value normalization workflow, an item value translation workflow, an item token generation workflow, a rights token generation workflow, and the like.

In example embodiments, the methods and systems of FIG. 254 for automatic triggering of actions across exchanges may be performed by a robotic process automation service 24560 that may be trained on a set of cross exchange workflow triggering actions, such as actions taken by humans, a cross-exchange action triggering facility, and the like. Robotic process automation services 24560 may facilitate autonomous configuration of links among transaction workflows, workflow actions, and exchange actions that enable actions in a first exchange automatically triggering actions in a second exchange. Robotic process automation services 24560 may facilitate automatically triggering one or more actions in one or more workflows for one or more exchanges for a set of transaction workflows across a plurality of exchanges.

Workflow Actions in a First Exchange May Initiate Workflows and/or Workflow Actions in a Second Exchange Referring to FIG. 255, use of robotic process automation 24660 for operation of a plurality of workflows 24658 across a plurality of exchanges with triggered cross-exchange workflow initiation is depicted. A set of robotic process automation services may be configured to orchestrate a set of transaction workflows in each of a plurality of exchanges, such that initiation of a set of actions in the set of transaction workflows in a first exchange automatically results in the triggering of a set of one or more corresponding actions in a workflow of the set of workflows in at least one other exchange. A set of robotic process automation services may be configured to orchestrate a set of transaction workflows in each of a plurality of exchanges, such that initiation of an action in a workflow of the set of transaction workflows of a first exchange automatically results in triggering a corresponding action in a workflow of the set of transaction workflows of a second exchange. In example embodiments, triggering the corresponding action in a workflow of the set of transaction workflows of the second exchange automatically results in triggering a corresponding action in a workflow of the set of workflows of a third exchange. In example embodiments, the action of the first exchange is a selected from a set of actions comprising a value normalizing action, a value translation action, an item token generation action, and a rights token generation action. In example embodiments, the automatically triggered action of the second exchange is a selected from a set of actions comprising a value normalizing action, a value translation action, an item token generation action, and a rights token generation action. In example embodiments, the automatically triggered action of the third exchange is a selected from a set of actions comprising a value normalizing action, a value translation action, an item token generation action, and a rights token generation action.

In example embodiments, initiation of a set of actions 24664 from a set of transaction workflows 24662 of a first exchange 24652 may automatically result in triggering one or more workflows 24668 of a set of workflows in a second exchange 24654. The set of workflows in the second exchange may include workflows with actions that correspond with the set of actions 24664. The set of workflows in the second exchange may include workflows with actions that coordinate/compliment the set of actions 24664. Further the set of workflows in the second exchange may include workflows with item-centric actions for an item associated with the set of transaction workflows 24662.

Further, initiation of the set of actions 24664 from the set of transaction workflows 24662 of the first exchange 24652 may automatically result in triggering one or more workflow actions 24670 of a third exchange 24656. Workflow robotic process automation may facilitate automated execution of workflows and/or workflow actions across a plurality of exchanges, including cascading actions across the plurality of exchanges. In the example of FIG. 255, a first workflow X WF 2 24666 of a first exchange X 24652 may include a workflow action, such as a value normalization action as described herein. Activation of the value normalization action in the first exchange 24652 may trigger a corresponding workflow action, such as a value normalization action in a second workflow Y WF 2 of a second exchange Y 24654. This triggered corresponding value normalization action may further trigger activation of an item token generation action in a third workflow Z WF 2 of a third exchange Z 24656. In example embodiments, each of the cascaded actions may be performed for a common item. In this example, a value normalization action of a first item in exchange X may trigger a corresponding value normalization action for the first item in exchange Y, which may trigger a corresponding item token generation action for the first item in exchange Z. In example embodiments, the triggered corresponding value normalization action of the Exchange Y may be based at least in part on a result of the value normalization action of exchange X. Likewise, the item token generation action of exchange Z may be based on a result of value normalization for the item of exchange Y. In example embodiments, while workflows and/or workflow actions, and/or exchange actions may automatically be triggered across the plurality of exchanges, each such action and/or workflow may be independent, other than due to triggering, of any other action in any other exchange, including cascading workflows and actions.

In example embodiments, the methods and systems of FIG. 255 for automatic triggering of actions across exchanges may be performed by a robotic process automation service 24660 that may be trained on a set of cross exchange workflow triggering actions, such as actions taken by humans, a cross-exchange action triggering facility, and the like. Robotic process automation services 24660 may facilitate autonomous configuration of links among transaction workflows, workflow actions, and exchange actions that enable actions in a first exchange automatically triggering actions in a second exchange. Robotic process automation services 24660 may facilitate automatically triggering one or more actions in one or more workflows for one or more exchanges for a set of transaction workflows across a plurality of exchanges.

Configuring a Smart Contract from Analysis of a Set of Smart Contracts in Each of a Plurality of Exchanges In embodiments, methods and systems may include a set of robotic process automation services that are configured to state the value of a set of items that are represented in a plurality of exchanges, such that representation of the value of each member of the set of items in the plurality of exchanges is normalized based on the native currencies of the respective exchanges and may include a set of robotic process automation services that are configured to inspect a set of smart contracts in each of a plurality of exchanges and to configure a smart contract that provides terms and conditions for a transaction that involves a transactional step in each of the plurality of exchanges.

In embodiments, methods and systems may include a set of robotic process automation services that are configured to automatically translate the value of an item represented in a first exchange into a value of the item for representation in a second exchange and may include a set of robotic process automation services that are configured to inspect a set of smart contracts in each of a plurality of exchanges and to configure a smart contract that provides terms and conditions for a transaction that involves a transactional step in each of the plurality of exchanges.

In embodiments, methods and systems may include a set of robotic process automation services that are configured to generate token that represents an item in an exchange based on characteristics of the item determined from data from a different exchange and may include a set of robotic process automation services that are configured to inspect a set of smart contracts in each of a plurality of exchanges and to configure a smart contract that provides terms and conditions for a transaction that involves a transactional step in each of the plurality of exchanges.

In embodiments, methods and systems may include a set of robotic process automation services that are configured to generate a digital representation of a set of rights relating to an item that is consistent with the governing rules of an exchange based on processing at least one of a set of smart contracts and a set of terms and conditions relating to the item and may include a set of robotic process automation services that are configured to inspect a set of smart contracts in each of a plurality of exchanges and to configure a smart contract that provides terms and conditions for a transaction that involves a transactional step in each of the plurality of exchanges.

Referring to FIG. 256 exemplary embodiments of the methods and systems for configuring a smart contract, such as a cross-exchange smart contract, that provides terms and conditions for a transaction associated with an item are depicted. The example embodiments are for applying a generated smart contract to adapt a normalized item value across transaction workflows in a plurality of exchanges. A robotic process automation service 24760 may be configured to operate and/or interact with a set of smart contract analysis services 24764 that may interface with a set of smart contract generation services 24766 to produce a cross-exchange smart contract 24770 that may be useful in one or more steps of one or more of a plurality of transaction workflows of one or more of a plurality of exchanges. A plurality of exchanges may be represented by an exemplary first exchange A 24752 that may be associated with one or more sets of smart contracts 24758 and that may optionally include a set of governing rules 24762. The exchange may process a transaction workflow 24776 that may include one or more steps for adapting a normalized item value 24774 of an item 24772. As depicted each of two additional exchanges in the plurality of exchanges, specifically exchanges B 24754 and exchange C 24756 may include one or more sets of smart contracts 24758, optionally one or more sets of governing rules 24762, an exchange-specific transaction workflow that may be similar to transaction workflow 24776 that may rely upon a cross exchange smart contract 24770 to adapt a normalized item value 24774 for an item 24772. In example embodiments, a set of smart contracts for each distinct exchange may include one or more smart contracts that may be similar to and/or distinct from other smart contracts in the set. One or more smart contracts in a set of smart contracts for a first exchange may be distinct from at least one other smart contract of at least one other exchange. In example embodiments, differences among smart contracts within and/or across exchanges may include differences in terms (e.g., effectivity start/stop dates), differences in conditions (jurisdictional differences, for example), differences driven by aspects of a corresponding exchange, and the like.

Governing rules 24762 for each of the plurality of exchanges may be configured to address exchange-specific governing factors, such as taxation, import/export regulations, exchange transaction fee structure, and many others. In example embodiments, governing rules may be optional for one or more of the plurality of exchanges.

In example embodiments, the smart contract analysis system 24764 may capture information that is descriptive of each of a plurality of smart contracts for at least a portion of the plurality of exchanges. In example embodiments, the smart contract analysis system 24764 may include a smart contract execution and/or simulation capability through which a smart contract may be simulated and monitored to capture information that is descriptive thereof, such as terms, conditions, input data sources, algorithms applied to such sources, thresholds, and the like. Through analysis of smart contracts for the portion of the plurality of exchanges, a set of terms and conditions may be determined that may be suitable for application to a set of transaction workflows. In an example, a resulting set of terms and conditions may be derived from a subset of terms and conditions that are common among the analyzed smart contracts. In this example, a common condition for each analyzed contract may include a condition that contract terms that are satisfied when the exchange is closed (e.g., after local business hours) are recorded as being satisfied when the exchange next opens (e.g., next business day and the like). In an example, a resulting set of terms and conditions may be a superset of terms and conditions from the analyzed smart contracts. In this example, a smart contract for a first exchange may include a condition that exchange data is captured hourly, and a smart contract for a second exchange may include a condition that exchange data is captured every 30 seconds. A resulting smart contract may include conditions that require exchange data to be captured every 30 seconds and every hour.

In example embodiments, a deliverable from the smart contact analysis system 24764 may include a set of terms and conditions, processing algorithms, data sources, and the like that may be adapted based on governing rules from one or more of the plurality of exchanges in a smart contract generation system 24766 that produces a smart contract that includes one or more terms and conditions from at least one of the plurality of sets of smart contracts. The smart contract generation system 24766 may further apply governing rules from each of the exchanges that apply to terms and/or conditions produced from the smart contract analysis system 24764. In example embodiments, a term for smart contact of a first exchange that survives the smart contract analysis system 24764 (e.g., that is included in a deliverable set of terms produced by the smart contract analysis system 24764) may be adapted based on a governing rule of the first exchange. In example embodiments, governing rules of a first exchange may be used to adapt at least one of term and conditions in the set of deliverables derived from analysis of a smart contract from a second exchange. As an example of application of exchange-specific governing rules to a resulting set of terms, a normalization action in a transaction workflow may be adapted to calculate the normalized value to a degree of precision defined by the governing rules. In example embodiments, if a governing rule in a first exchange defines normalized value precision to be two decimal places, and a governing rules in a second exchange defines normalized value precision to be three decimal places, a resulting cross-exchange smart contract may require normalization to three decimal places for each application of the cross-exchange smart contract. In example embodiments, a smart contract produced by the smart contract generation system 24766 may include a cross-exchange smart contract 24770.

Further in the exemplary embodiment depicted in FIG. 256, the cross-exchange smart contract 24770 may be configured to impact a transaction workflow step, such as step Y in each of a plurality of transaction workflows 24776 for a plurality of exchanges. As an example of application of a cross-exchange smart contract derived from a plurality of smart contracts, step Y in each of the plurality of transaction workflows 24776 may include accessing a normalized value for an item in the exchange, applying a smart contract-specified adjustment, and setting a transaction price in the exchange for the item. In the example embodiment of FIG. 256, the cross exchange smart contract 24770 may provide an adjustment value, an adjustment approach (e.g., an algorithm), and/or other conditions under which the accessed normalized item value is adjusted. Further the cross-exchange smart contract 24770 may be configured to prescribe an adjustment that applies to a specific exchange, to a plurality of exchanges, or to all exchanges. Yet further the cross-exchange smart contract 24770 may provide conditions under which the normalized value is adjusted that are different for one or more of the plurality of exchanges. In an example, a smart contract for exchange A may include a term that requires no adjustment in normalized value; a smart contract for exchange B may include a term that requires a conditional adjustment (e.g., based on transaction value and the like); a smart contract for exchange C may include a term that requires an adjustment to normalized value that results in rounding off the normalized value to a whole unit of local currency. Each of these terms may be configured into the cross exchange smart contract 24770 so that when it is applied to a transaction workflow, a term that corresponds to an exchange in which the transaction workflow occurs can be applied to adjust the normalized value. Through application of a cross exchange smart contract 24770, normalized item value may be automatically generated for an item across a plurality of exchanges. Further use of robotic process automation for generating cross exchange smart contracts may facilitate orchestration of transaction workflows that can be automatically and dynamically adapted.

In the exemplary normalized item value embodiments depicted in FIG. 256, use of the methods and systems for generating and applying a cross exchange smart contact 24770 may facilitate generating an exchange-specific normalized value for an item in each of a plurality of exchanges that factors in one or more terms and conditions associated with a smart contact for each of the exchanges.

In example embodiments, the methods and systems of FIG. 256 for cross-exchange smart contract generation may be performed by a robotic process automation service 24760 that may be trained on a set of smart contract generation actions, such as actions taken by humans, the smart contract analysis system 24764, the smart contract generation system 24766, and the like. Robotic process automation services 24760 may facilitate autonomous generation of a smart contract based on terms and conditions of a plurality of smart contracts across a plurality of exchanges. Robotic process automation services 24760, when combined with the smart contract analysis system capabilities and the smart contract generation system capabilities may automate generation of a cross exchange smart contract 24770 based on a plurality of exchange governing rules 24762 across the plurality of exchanges.

Self-Adapting Asset Data Delivery Network Infrastructure Pipeline

In embodiments, provided herein are computer-implemented methods and systems for automated orchestration of one or more marketplaces, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path.

In embodiments, provided herein are computer-implemented methods and systems for automated orchestration of one or more marketplaces, such methods and systems are provided having a set of robotic process automation services that are configured to automatically translate the value of an item represented in a first exchange into a value of the item for representation in a second exchange and having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path.

In embodiments, provided herein are computer-implemented methods and systems for automated orchestration of one or more marketplaces, such methods and systems are provided having a set of robotic process automation services that are configured to generate token that represents an item in an exchange based on characteristics of the item determined from data from a different exchange and having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path.

In embodiments, provided herein are computer-implemented methods and systems for automated orchestration of one or more marketplaces, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path.

Referring to FIG. 257, a data and network infrastructure pipeline 24800 is configured to deliver data from a set of assets 24852 to one or more marketplace entities for one or more marketplaces 24868 in which transactions for portions of the sets of assets 24852 are conducted. In example embodiments, the data from the set of assets 24852 is delivered by the pipeline 24800 to an interface by which an operator orchestrates a set of parameters for a set of transaction workflows involving the assets. The pipeline 24800 may be automatically configured to adjust a network path for delivery of data from the set of assets 24852 to the interface based on the characteristics of the data and at least one performance parameter of the network path. In example embodiments, the pipeline 24800 may be automatically configured to adjust timing of asset data delivery from the set of assets 24852 to the interface based on at least one of a transaction parameter and a network performance parameter.

Referring again to FIG. 257, the data and network infrastructure pipeline 24800 may include sets of asset-centric intelligent network resources 24854 that may be disposed proximal to the set of assets 24852. These sets of asset-centric intelligent network resources 24854 may include a set of asset local resources that are configured to work cooperatively manage, for example use of network storage to preserve data delivered from the sets of assets 24852 for supporting delivery of the asset data through the pipeline 24800. These asset local resources 24854 may be configured to interface with intelligent assets, such as electronic assets. These asset local resources 24854 may automatically determine, such as through analysis of data from such electronic asset configuration parameters for interfacing with one or more corresponding electronic assets.

The data and network infrastructure pipeline 24800 may further include a set of intermediate intelligent network resources 24856 that may be adapted to deliver asset data from the asset local resources 24854 on to one or more marketplace related interfaces 24868, such as a user interface, a smart contract, and the like. The set of intermediate intelligent network resources 24856 may include a network path adaptation/determination system that facilitates adapting a network path by producing an automatically adapted network route for the asset data. Such a network path adaptation/determination system may perform network path determination based on characteristics of the asset data.

The data and network infrastructure pipeline 24800 may also include a set of marketplace-centric intelligent network resources 24866 that may be disposed proximal to recipients of the asset data, such as interfaces associated with a marketplace 24868 in which one or more transactions (and associated transaction workflows) for the assets 24852 may be conducted. Examples of marketplace-centric intelligent network resources 24866 may include an item value normalization system 24858, a cross-exchange item value translation system 24860, an item token generation system 24862, an item rights token generation system 24864, and the like.

In example embodiments, the item value normalization system 24858 may include a set of robotic process automation services that are configured to state the value of a set of items that are represented in a plurality of exchanges, such that representation of the value of each member of the set of items in the plurality of exchanges is normalized based on the native currencies of the respective exchanges, example embodiments of which are described herein, including without limitation embodiments depicted in FIGS. 241, 242, and 243. In example embodiments, the cross-exchange item value translation system 24860 may include a set of robotic process automation services that are configured to automatically translate the value of an item represented in a first exchange into a value of the item for representation in a second exchange, example embodiments of which are described herein, including without limitation embodiments depicted in FIGS. 244 and 245. In example embodiments, the item token generation system 24862 may include a set of robotic process automation services that are configured to generate a token that represents an item in an exchange based on characteristics of the item determined from data from a different exchange, example embodiments of which are described herein, including without limitation FIGS. 246, 247, and 248. In example embodiments, the item rights token generation system 24864 may include a set of robotic process automation services that are configures for generating rights tokens (and optional corresponding smart contracts) that are representative of a set of rights relating to an item based at least in part on one or more of a smart contract of an item, or a set of terms and conditions of the item, example embodiments of which are described herein, including without limitation FIGS. 249, 250, 251, and 252.

The one or more sets of intelligent network resources, such as sets of asset-centric resources 24852, intermediate resources 24856, or sets of marketplace-centric resources 24866 may be implemented in or in association with physical resources of a data communication network, such as the Internet and the like. Sets of asset-centric resources 24854 and/or sets of marketplace (e.g., asset data recipient) centric resources 24866 may include network infrastructure resources, such as edge computing devices, inter-network interface devices (e.g., bridges, routers, and the like), aggregation devices, such as a distributed antenna system, and the like.

In embodiments, methods and systems are provided that may include a set of robotic process automation services that are configured to state the value of a set of items that are represented in a plurality of exchanges, such that representation of the value of each member of the set of items in the plurality of exchanges is normalized based on the native currencies of the respective exchanges and having a set of application programming interfaces to a marketplace that are configured to be integrated into a digital twin platform, such that interactions with a set of interfaces of the digital twin platform automatically trigger a set of transaction workflows within the marketplace.

In embodiments, methods and systems are provided that may include a set of robotic process automation services that are configured to automatically translate the value of an item represented in a first exchange into a value of the item for representation in a second exchange and having a digital twin that represents a set of entities, workflows, and transaction parameters of a plurality of exchanges, such that interaction with the interface of the digital twin can orchestrate an interaction in each of the plurality of exchanges.

In embodiments, methods and systems are provided that may include a set of robotic process automation services that are configured to generate a token that represents an item in an exchange based on characteristics of the item determined from data from a different exchange and having a digital twin that represents a set of entities, workflows, and transaction parameters of a plurality of exchanges, such that interaction with the interface of the digital twin can orchestrate an interaction in each of the plurality of exchanges.

In embodiments, methods and systems are provided that may include a set of robotic process automation services that are configured to generate a digital representation of a set of rights relating to an item that is consistent with the governing rules of an exchange based on processing at least one of a set of smart contracts and a set of terms and conditions relating to the item and having a digital twin that represents a set of entities, workflows, and transaction parameters of a plurality of exchanges, such that interaction with the interface of the digital twin can orchestrate an interaction in each of the plurality of exchanges.

In embodiments, methods and systems are provided that may include a set of robotic process automation services that are configured to generate a digital representation of a set of rights relating to an item that is consistent with the governing rules of an exchange based on processing at least one of a set of smart contracts and a set of terms and conditions relating to the item and having a set of application programming interfaces to a marketplace that are configured to be integrated into a digital twin platform, such that interactions with a set of interfaces of the digital twin platform automatically trigger a set of transaction workflows within the marketplace.

Normalization, Translation, Item Tokens, Rights Tokens, and Combinations Thereof In embodiments, provided herein are computer-implemented methods and systems for automated orchestration of one or more marketplaces, such methods and systems having a set of robotic process automation services that are configured to state the value of a set of items that are represented in a plurality of exchanges, such that representation of the value of each member of the set of items in the plurality of exchanges is normalized based on the native currencies of the respective exchanges.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to automatically translate the value of an item represented in a first exchange into a value of the item for representation in a second exchange. In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to generate token that represents an item in an exchange based on characteristics of the item determined from data from a different exchange. In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to generate a digital representation of a set of rights relating to an item that is consistent with the governing rules of an exchange based on processing at least one of a set of smart contracts and a set of terms and conditions relating to the item.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to orchestrate a set of transaction workflows in each of a plurality of exchanges, such that initiation of a set of actions in one exchange automatically results in the triggering of a set of actions in at least one other exchange.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to orchestrate a set of transaction workflows in each of a plurality of exchanges, such that initiation of a set of actions in the set of transaction workflows in one exchange automatically results in the triggering of a set of corresponding/coordinating/item-centric in at least one other exchange.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to orchestrate a set of transaction workflows in each of a plurality of exchanges, such that initiation of a set of actions in the set of transaction workflows that causes/contributes to initiation of one of the set of workflows in one exchange automatically results in the triggering of a set of actions that result in activating at least one of a corresponding set of workflows in at least one other exchange.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of robotic process automation services that are configured to orchestrate a set of transaction workflows in each of a plurality of exchanges, such that initiation of a set of actions in the set of transaction workflows that causes/contributes to initiation of one of the set of workflows in one exchange automatically results in the triggering of a set of corresponding/coordinating/item-centric actions that result in activating at least one of a corresponding set of workflows in at least one other exchange. In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a digital twin that represents a set of entities, workflows, and transaction parameters of a plurality of exchanges, such that interaction with an interface of the digital twin can orchestrate an interaction in each of the plurality of exchanges.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter. In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of application programming interfaces to a marketplace that are configured to be integrated into an electronic wallet system, such that interactions with a set of interfaces of the wallet system automatically trigger a set of transaction workflows within the marketplace.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of application programming interfaces to a marketplace that are configured to be integrated into a digital twin platform, such that interactions with a set of interfaces of the digital twin platform automatically trigger a set of transaction workflows within the marketplace.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of application programming interfaces to a marketplace that are configured to be integrated into an enterprise database platform, such that interactions with a set of interfaces of the enterprise database platform automatically trigger a set of transaction workflows within the marketplace.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of application programming interfaces to a marketplace that are configured to be integrated into a platform-as-a-service platform, such that interactions with a set of interfaces of the platform-as-a-service platform automatically trigger a set of transaction workflows within the marketplace.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of application programming interfaces to a marketplace that are configured to be integrated into a computer-aided design platform, such that interactions with a set of interfaces of the computer-aided design platform automatically trigger a set of transaction workflows within the marketplace.

In embodiments, such methods and systems are provided having a set of robotic process automation services that are configured to state the value of a set of items that are represented in a plurality of exchanges, such that representation of the value of each member of the set of items in the plurality of exchanges is normalized based on the native currencies of the respective exchanges and having a set of application programming interfaces to a marketplace that are configured to be integrated into a video game, such that interactions with a set of interfaces of the video game automatically trigger a set of transaction workflows within the marketplace.

In embodiments, provided herein are computer-implemented methods and systems for automated orchestration of one or more marketplaces, such methods and systems having a set of robotic process automation services that are configured to automatically translate the value of an item represented in a first exchange into a value of the item for representation in a second exchange. In embodiments, such methods and systems are provided having a set of robotic process automation services that are configured to automatically translate the value of an item represented in a first exchange into a value of the item for representation in a second exchange and having a set of robotic process automation services that are configured to generate token that represents an item in an exchange based on characteristics of the item determined from data from a different exchange. In embodiments, such methods and systems are provided having a set of robotic process automation services that are configured to automatically translate the value of an item represented in a first exchange into a value of the item for representation in a second exchange and having a set of robotic process automation services that are configured to generate a digital representation of a set of rights relating to an item that is consistent with the governing rules of an exchange based on processing at least one of a set of smart contracts and a set of terms and conditions relating to the item. In embodiments, such methods and systems are provided having a set of robotic process automation services that are configured to automatically translate the value of an item represented in a first exchange into a value of the item for representation in a second exchange and having a set of robotic process automation services that are configured to orchestrate a set of transaction workflows in each of a plurality of exchanges, such that initiation of a set of actions in one exchange automatically results in the triggering of a set of actions in at least one other exchange. In embodiments, such methods and systems are provided having a set of robotic process automation services that are configured to automatically translate the value of an item represented in a first exchange into a value of the item for representation in a second exchange and having a digital twin that represents a set of entities, workflows, and transaction parameters of a plurality of exchanges, such that interaction with the interface of the digital twin can orchestrate an interaction in each of the plurality of exchanges. In embodiments, such methods and systems are provided having a set of robotic process automation services that are configured to automatically translate the value of an item represented in a first exchange into a value of the item for representation in a second exchange and having a set of robotic process automation services that are configured to inspect a set of smart contracts in each of a plurality of exchanges and to configure a smart contract that provides terms and conditions for a transaction that involves a transactional step in each of the plurality of exchanges. In embodiments, such methods and systems are provided having a set of robotic process automation services that are configured to automatically translate the value of an item represented in a first exchange into a value of the item for representation in a second exchange and having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path. In embodiments, such methods and systems are provided having a set of robotic process automation services that are configured to automatically translate the value of an item represented in a first exchange into a value of the item for representation in a second exchange and having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter. In embodiments, such methods and systems are provided having a set of robotic process automation services that are configured to automatically translate the value of an item represented in a first exchange into a value of the item for representation in a second exchange and having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter. In embodiments, such methods and systems are provided having a set of robotic process automation services that are configured to automatically translate the value of an item represented in a first exchange into a value of the item for representation in a second exchange and having a set of application programming interfaces to a marketplace that are configured to be integrated into an electronic wallet system, such that interactions with a set of interfaces of the wallet system automatically trigger a set of transaction workflows within the marketplace. In embodiments, such methods and systems are provided having a set of robotic process automation services that are configured to automatically translate the value of an item represented in a first exchange into a value of the item for representation in a second exchange and having a set of application programming interfaces to a marketplace that are configured to be integrated into a digital twin platform, such that interactions with a set of interfaces of the digital twin platform automatically trigger a set of transaction workflows within the marketplace. In embodiments, such methods and systems are provided having a set of robotic process automation services that are configured to automatically translate the value of an item represented in a first exchange into a value of the item for representation in a second exchange and having a set of application programming interfaces to a marketplace that are configured to be integrated into an enterprise database platform, such that interactions with a set of interfaces of the enterprise database platform automatically trigger a set of transaction workflows within the marketplace. In embodiments, such methods and systems are provided having a set of robotic process automation services that are configured to automatically translate the value of an item represented in a first exchange into a value of the item for representation in a second exchange and having a set of application programming interfaces to a marketplace that are configured to be integrated into a platform-as-a-service platform, such that interactions with a set of interfaces of the platform-as-a-service platform automatically trigger a set of transaction workflows within the marketplace. In embodiments, such methods and systems are provided having a set of robotic process automation services that are configured to automatically translate the value of an item represented in a first exchange into a value of the item for representation in a second exchange and having a set of application programming interfaces to a marketplace that are configured to be integrated into a computer-aided design platform, such that interactions with a set of interfaces of the computer-aided design platform automatically trigger a set of transaction workflows within the marketplace. In embodiments, such methods and systems are provided having a set of robotic process automation services that are configured to automatically translate the value of an item represented in a first exchange into a value of the item for representation in a second exchange and having a set of application programming interfaces to a marketplace that are configured to be integrated into a video game, such that interactions with a set of interfaces of the video game automatically trigger a set of transaction workflows within the marketplace.

In embodiments, provided herein are computer-implemented methods and systems for automated orchestration of one or more marketplaces, such methods and systems having a set of robotic process automation services that are configured to generate token that represents an item in an exchange based on characteristics of the item determined from data from a different exchange. In embodiments, such methods and systems are provided having a set of robotic process automation services that are configured to generate token that represents an item in an exchange based on characteristics of the item determined from data from a different exchange and having a set of robotic process automation services that are configured to generate a digital representation of a set of rights relating to an item that is consistent with the governing rules of an exchange based on processing at least one of a set of smart contracts and a set of terms and conditions relating to the item. In embodiments, such methods and systems are provided having a set of robotic process automation services that are configured to generate token that represents an item in an exchange based on characteristics of the item determined from data from a different exchange and having a set of robotic process automation services that are configured to orchestrate a set of transaction workflows in each of a plurality of exchanges, such that initiation of a set of actions in one exchange automatically results in the triggering of a set of actions in at least one other exchange. In embodiments, such methods and systems are provided having a set of robotic process automation services that are configured to generate token that represents an item in an exchange based on characteristics of the item determined from data from a different exchange and having a digital twin that represents a set of entities, workflows, and transaction parameters of a plurality of exchanges, such that interaction with the interface of the digital twin can orchestrate an interaction in each of the plurality of exchanges. In embodiments, such methods and systems are provided having a set of robotic process automation services that are configured to generate token that represents an item in an exchange based on characteristics of the item determined from data from a different exchange and having a set of robotic process automation services that are configured to inspect a set of smart contracts in each of a plurality of exchanges and to configure a smart contract that provides terms and conditions for a transaction that involves a transactional step in each of the plurality of exchanges. In embodiments, such methods and systems are provided having a set of robotic process automation services that are configured to generate token that represents an item in an exchange based on characteristics of the item determined from data from a different exchange and having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path. In embodiments, such methods and systems are provided having a set of robotic process automation services that are configured to generate token that represents an item in an exchange based on characteristics of the item determined from data from a different exchange and having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter. In embodiments, such methods and systems are provided having a set of robotic process automation services that are configured to generate token that represents an item in an exchange based on characteristics of the item determined from data from a different exchange and having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter. In embodiments, such methods and systems are provided having a set of robotic process automation services that are configured to generate token that represents an item in an exchange based on characteristics of the item determined from data from a different exchange and having a set of application programming interfaces to a marketplace that are configured to be integrated into an electronic wallet system, such that interactions with a set of interfaces of the wallet system automatically trigger a set of transaction workflows within the marketplace. In embodiments, such methods and systems are provided having a set of robotic process automation services that are configured to generate token that represents an item in an exchange based on characteristics of the item determined from data from a different exchange and having a set of application programming interfaces to a marketplace that are configured to be integrated into a digital twin platform, such that interactions with a set of interfaces of the digital twin platform automatically trigger a set of transaction workflows within the marketplace. In embodiments, such methods and systems are provided having a set of robotic process automation services that are configured to generate token that represents an item in an exchange based on characteristics of the item determined from data from a different exchange and having a set of application programming interfaces to a marketplace that are configured to be integrated into an enterprise database platform, such that interactions with a set of interfaces of the enterprise database platform automatically trigger a set of transaction workflows within the marketplace. In embodiments, such methods and systems are provided having a set of robotic process automation services that are configured to generate token that represents an item in an exchange based on characteristics of the item determined from data from a different exchange and having a set of application programming interfaces to a marketplace that are configured to be integrated into a platform-as-a-service platform, such that interactions with a set of interfaces of the platform-as-a-service platform automatically trigger a set of transaction workflows within the marketplace. In embodiments, such methods and systems are provided having a set of robotic process automation services that are configured to generate token that represents an item in an exchange based on characteristics of the item determined from data from a different exchange and having a set of application programming interfaces to a marketplace that are configured to be integrated into a computer-aided design platform, such that interactions with a set of interfaces of the computer-aided design platform automatically trigger a set of transaction workflows within the marketplace. In embodiments, such methods and systems are provided having a set of robotic process automation services that are configured to generate token that represents an item in an exchange based on characteristics of the item determined from data from a different exchange and having a set of application programming interfaces to a marketplace that are configured to be integrated into a video game, such that interactions with a set of interfaces of the video game automatically trigger a set of transaction workflows within the marketplace.

In embodiments, provided herein are computer-implemented methods and systems for automated orchestration of one or more marketplaces, such methods and systems having a set of robotic process automation services that are configured to generate a digital representation of a set of rights relating to an item that is consistent with the governing rules of an exchange based on processing at least one of a set of smart contracts and a set of terms and conditions relating to the item. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of robotic process automation services that are configured to orchestrate a set of transaction workflows in each of a plurality of exchanges, such that initiation of a set of actions in one exchange automatically results in the triggering of a set of actions in at least one other exchange. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a digital twin that represents a set of entities, workflows, and transaction parameters of a plurality of exchanges, such that interaction with the interface of the digital twin can orchestrate an interaction in each of the plurality of exchanges. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of robotic process automation services that are configured to inspect a set of smart contracts in each of a plurality of exchanges and to configure a smart contract that provides terms and conditions for a transaction that involves a transactional step in each of the plurality of exchanges. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of application programming interfaces to a marketplace that are configured to be integrated into an electronic wallet system, such that interactions with a set of interfaces of the wallet system automatically trigger a set of transaction workflows within the marketplace. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of application programming interfaces to a marketplace that are configured to be integrated into a digital twin platform, such that interactions with a set of interfaces of the digital twin platform automatically trigger a set of transaction workflows within the marketplace. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of application programming interfaces to a marketplace that are configured to be integrated into an enterprise database platform, such that interactions with a set of interfaces of the enterprise database platform automatically trigger a set of transaction workflows within the marketplace. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of application programming interfaces to a marketplace that are configured to be integrated into a platform-as-a-service platform, such that interactions with a set of interfaces of the platform-as-a-service platform automatically trigger a set of transaction workflows within the marketplace. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of application programming interfaces to a marketplace that are configured to be integrated into a computer-aided design platform, such that interactions with a set of interfaces of the computer-aided design platform automatically trigger a set of transaction workflows within the marketplace. In embodiments, such methods and systems are provided having a set of robotic process automation services that are configured to generate a digital representation of a set of rights relating to an item that is consistent with the governing rules of an exchange based on processing at least one of a set of smart contracts and a set of terms and conditions relating to the item and having a set of application programming interfaces to a marketplace that are configured to be integrated into a video game, such that interactions with a set of interfaces of the video game automatically trigger a set of transaction workflows within the marketplace.

Governance

Data curation allows companies to provide personalized, high quality services to their customers. AI allows for data curation on a grander scale, providing companies with more expansive and detailed information about the usage of their product. However, AI has not proven to be a flawless data collector and curator-rather, the development of AI in the data collection and curation sphere has brought about new challenges that require governance and policy. As new laws and regulations begin to emerge surrounding the governance of AI, companies must adapt their data curation and collection to provide a system of rules that guarantees a quality of service across the network of their organization. More than ever, trust and accountability must be at the forefront of any developing AI technology. High profile incidents involving breaches of personal data have ebbed away at public trust, and AI introduces a new variable that could further destabilize the general perception of data collection and curation. Therefore, it is necessary to establish core guidelines and practices surrounding the governance of AI training data sets in their connection to neural networks. Memory Enhanced Artificial Neural Networks establish basic operating measures for AI that allow training, model verification, and algorithm validation of data sets. These practices address the biases in AI technology that stem from erroneous assumptions in the training data used in a machine learning model. These systemic prejudices could skew datasets and provide an incomplete summary based on a portion of the population that either does not accurately represent the whole or does not incorporate appropriate nuance into its analysis. In a world as diverse and interconnected as our own, these biases are hindrances that prevent companies from ensuring their customers receive the most secure and optimized user experience. MEANN and/or DPANN enable the governance of human-AI interactions to better address these biases through transparency and feedback, creating auditing systems that ensure that the AI's training data sets meet standardized rules and regulations. These networks foster transparency by providing consumer access to the training data. In embodiments, governance of a neural network may include identification, calculation, and utilization of various measures of trust of a neural network, such as ones that factor in one or more of visibility of input data, visibility of feedback factors, outcome tracking, training data set quality, model verification data set quality, algorithm validation (which in embodiments may occur within a derivative marketplace for validation), various indices (such as pricing, ranking, rating, and others), accuracy measures (including comparisons to other AI-based solutions and other systems), consistency, reliability, and various test measures (such as ones of performance, reliability, energy consumption, and others).

In embodiments, the platform 100 may include a governance system 23360 configured to create a governance parameter based on a governance goal, the governance parameter being a rule to be followed by the AI entity and embed the governance parameter into the AI deployment system. The AI deployment system is configured to apply the governance parameter governing at least one parameter of the deployment of the AI entity, such that the AI entity is trained and deployed to perform the operation in compliance with the governance parameter. The governance system 23360 may be at least partially enabled by an AI module. The AI module may be configured to perform modification of the governance parameter. The AI module may be configured to perform modification of the governance goal.

In embodiments, the AI module may be configured to determine whether, after training of the AI entity, performance of the operation by the AI entity meets the governance goal. The AI module may be configured to, upon determining that the performance of the operation by the AI entity does not meet the governance goal, modify the governance parameter. The AI module may be or include one or more of a machine learned process, an intelligent agent, and a neural network. The AI module may be or include a dual-process artificial neural network.

In embodiments, the platform 100 may include a governance interface configured to facilitate interaction with the governance system 23360 by a user. The governance interface may allow the user to input the operation that the user desires the AI entity to be trained to perform. The governance system 23360 may create the governance parameter based on the governance goal and the operation. The governance interface may allow the user to input the governance goal that the user desires the AI entity to be trained to perform. The governance system 23360 may create the governance parameter based on the governance goal. The governance interface may allow the user to view the training dataset. The governance interface may allow the user to apply the governance parameter to the training dataset. The governance interface may allow the user to view at least one of input data, feedback factors, outcome tracking, training dataset quality, model verification data set quality, algorithm validation, indices, accuracy measures, consistency, reliability, or test measures during or after training of the AI entity. The governance interface may allow the user to set at least one governance parameter governing the at least one of input data, feedback factors, outcome tracking, training dataset quality, model verification data set quality, algorithm validation, indices, accuracy measures, consistency, reliability, or test measures.

In embodiments, the governance system 23360 may be configured to determine input data, feedback factors, outcome tracking, training dataset quality, model verification data set quality, algorithm validation, indices, accuracy measures, consistency, reliability, and/or test measures during or after training of the AI entity. The governance system 23360 may be configured to determine a measure of trust of the AI entity.

In embodiments, the AI module may be configured to determine whether the AI entity meets a trust threshold. The AI module may be configured to, upon determining that the AI entity does not meet the trust threshold, modify the governance parameter.

In embodiments, the governance goal may include governing an AI-human interaction framework. The AI entity may be one or more of a machine learned process, an intelligent agent, and a neural network. The operation may include analysis of sensitive data. The systemic bias may include an erroneous assumption, the erroneous assumption causing a skew in performance of the AI entity. The governance parameter may relate to at least one of a training dataset, an input data set, a configuration parameter, a function, an output, a feedback parameter, or an objective of the AI deployment system. The operation may include a classification operation. The operation may include a prediction operation. The operation may include a recommendation operation. The operation may include an optimization operation.

In embodiments, the operation may include a control operation. The control operation may include data curation.

In embodiments, the governance goal may include reducing systemic bias of the AI entity. The governance goal may include reducing systemic bias in the training data set of the AI entity. The governance system 23360 may recommend an augmentation of the training data set of the AI entity that reduces the systemic bias.

In embodiments, governance of a neural network may include identification, calculation, and utilization of various measures of trust of a neural network, such as ones that factor in one or more of visibility of input data, visibility of feedback factors, outcome tracking, training data set quality, model verification data set quality, algorithm validation (which in embodiments may occur within a derivative marketplace for validation), various indices (such as pricing, ranking, rating, and others), accuracy measures (including comparisons to other AI-based solutions and other systems), consistency, reliability, and various test measures (such as ones of performance, reliability, energy consumption, and others). As one example, an energy policy may govern the amount, timing, and/or source of energy that is permitted to be used for an activity, such as an operational activity, computational activity, or the like, such as one that requires carbon neutrality of an overall operation, one that requires use of a fraction of renewable energy, one that requires renewable energy credits, or many others. The policy may track the amount and type of energy used for AI workloads (including workloads used to train a model and/or to run a model in operation. In embodiments, a training data set may include tracking data that indicates the energy used for model creation and the energy required for model deployment, including based on context, such as energy required under varying conditions, such as different processing environments, different network environments, and the like. Thus, an energy-governed AI model and/or energy-governed AI training data set may be provided in connection with support of marketplace operations and/or automation, and an energy-compliance measure of trust may be provided for model rating or comparison.

Traditional asset classes and new asset classes like cryptocurrency may be represented in combination in a wallet with improved visibility/transparency, increased control and transferability. Reduction of costs associated with efficiency will broaden the role of financial services into new types of markets.

Ethereum tokens enable an ethereum based system, as it is programmable and can form a smart contract. NFTs may have intrinsic value, thereby removing the economics of the token and attaching a value of the token associated with a specific piece of property. Different kinds of NFTs include a disposable asset, such as an experience (e.g., a movie ticket) or physical asset, a unique asset such as a piece of art, such as fractional ownership of a piece of art, virtual real estate (e.g., inside video games and other spaces), NFTs representing types of rights or fractional rights for ownership of goods, such as fractional ownership of a car or boat, NFTs representing verification of ownership of a physical item, specific seats or a class of seats, NFTs representing approved use, for example with drugs making sure people do not over consume, or with graphics cards the maker prefers to sell to gamers (e.g., for branding reasons), and/or NFTs representing transformation of social media, such as information about the rank within the community.

Intelligent Data Layers

The present disclosure relates to a platform for intelligent data layers (IDLs) for facilitating and reorienting transaction flows, such as flows of software orchestrated transactions, by providing timely, contextual and transaction-impacting data for buyers, sellers, and automated platform functions, such as software orchestration. In embodiments, IDLs may actively harvest, curate, and ready transaction-derived data to facilitate cross market interactions thereby enhancing provisioning of complementary services within or as a direct derivative of transactions.

Referring to FIG. 258, a block diagram of exemplary features, capabilities, and interfaces of an exemplary embodiment of an intelligent data layer platform 25900 is depicted. Intelligent data layers (referred to herein and elsewhere as an IDL when singular and IDLs when plural) may be configured as a portion (or portions) of an IDL platform. The exemplary embodiment in FIG. 258 depicts an IDL 25904 characterized with at least one each of an ingestion, parse, analyze, and control tower elements interconnected for providing intelligence-based and other derivatives of data sources, such as IDL data sources 25902. Exemplary embodiments of 25904 are depicted and described elsewhere herein. Associated with the exemplary IDL platform 25900 of FIG. 258, IDL data sources 25902 may represent one or more sources of information, such as business data, sensor data, outputs of other IDLs, virtual data, and the like to which IDL processes may be applied. In an exemplary transaction platform deployment of IDL methods and systems, which is described elsewhere herein in greater detail, data sources 25902 may represent transaction outcomes, buyer and/or seller operating environments, market data, and the like.

In embodiments, an IDL, such as 25904 may be configured with or operationally connected to a set of application programming interfaces (APIs) through which, among other things, IDL source data may be retrieved and/o received. In exemplary embodiments, an API for an IDL may be an open/standardized API (e.g., banking/financial institution open APIs) that, among other things, may equip the IDL platform 25900 for integration with and into current and emerging eco systems. Use of open/standardized APIs, while not essential for all IDL embodiments, may further enable IDLs to integrate into a wide range of data workflows, such as corporate internal workflows, inter-jurisdiction data workflows, and the like.

An IDL platform such as 25900 may include, reference, and/or provide market orchestration elements 25908 that may facilitate use of IDL capabilities for various aspects of market orchestration, including, without limitations, software orchestrated transactions, software orchestrated marketplaces, and the like. Market orchestration elements 25908 may facilitate deployment of an IDL, such as a web service embodiment, as an integrated function of a market orchestration platform, such as an automated market orchestration system of systems as described herein. In embodiments, an IDL may provide data and network pipeline capabilities for market orchestration when configured as a portion of an IDL platform 25900 in association with market orchestration elements 25908 and the like.

IDL platform 25900 may include, reference and/or provide cross market interaction capabilities 25910 that may enable leveraging intelligence data layer principals, computation capabilities, storage and data sourcing capabilities, as well as intelligence capabilities for cross market interactions. Cross market interaction capabilities 25910 may include interfaces to one or more marketplaces, transaction environments, and the like, so that, among other things, an IDL may be configured with one market in a cross-market integration deployment as a source of data and with another market in the cross-market integration deployment as a consumer of the IDL. In embodiments, a similar arrangement may be constructed between two or more markets so that data in either market can be used as a data source and can be influenced by data from another market. Cross market interactions 25910 may be accomplished through one or more market-to-market IDLs that form data pipelines for intelligent exchange of data among markets, such as data about buyers in one market and about sellers in another.

In the exemplary IDL platform embodiment of FIG. 258, functions and processes 25912, for an exemplary market-oriented deployment may include software-oriented transaction functions and processes, automatic transaction transactions and processes, and the like. Functions and processes 25912 for an IDL platform 25900 may include signaling availability of data (e.g., emergence of an occurrence of source data) that impacts data produced by (for example) an intelligent data layer of the platform. Other exemplary functions and processes 25912 may include embedding into smart contracts, tokens, publishing data on a schedule, or other occurrence (e.g., an initiation of a smart contract and the like). Yet other functions and processes may include payments between/among machines and the like.

In embodiments, an IDL platform may include and/or be associated with intelligent data layer technology enablers 25914, such as 5G networking, artificial intelligence, visualization technology (e.g., VR/AR/XR), distributed ledger, and the like.

In embodiments, an IDL platform, such as platform 25900 may include and/or leverage cloud-based virtualized containerization capabilities and services 25916, such as without limitation a container deployment and operation controller, such as Kubernetes 25918 and the like. Cloud-based virtualized containers provide for IDLs to be deployed close to source data, thereby potentially reducing network bandwidth consumption or the potential for network disturbances in a data workflow and without substantive investment in infrastructure by the IDL operator and/or consumer.

The IDL platform of FIG. 258 may further include business system interfaces 25920, such as APIs and the like that facilitate adoption of IDLs by enterprises for development, among other things of a data-centric business workflow environment that enables cross-functional data use, seamless aggregation, and immediate contextualization of corporate data for each individual department, enterprise, subsidiary, and the like.

IDL enabled markets 25922 may be enabled by and/or enhanced through the adoption of intelligent data layer technology. Markets, such as markets at an intersection of financial service and physical product offerings may be revealed and/or enabled through application of IDLs to help parse, analyze, and provide intelligence for a wide range of market-impacting and/or related data sources. These emergent markets may be substantively constructed as a result of intelligence gathered by use of IDLs within or in association with individual markets, and the like.

Technologies that may be provided by and/or enabled by an IDL platform 25900 may include intelligence services 25924, such as artificial intelligence, machine learning and the like. These intelligence services 25924 may be provided by the platform 25900, or accessed (e.g., as third-party services) via one or more interfaces o the platform 25900. Each IDL embodiment 25904 may be provided access to these intelligence services 25924 via the platform. One or more IDL embodiments 25904 may bring to the platform its own set of intelligence services, which may be dedicated to the host IDL, or may be shareable, such as via the platform 25900 with other IDLs of the platform, for example.

In the exemplary embodiment of FIG. 258, transaction/market-oriented capabilities, services, and deployment may include market platforms 25926, transaction flows 25928, buyers 25932, sellers 25931, and intelligent data layers that enrich transactions, transaction services and the like 25930. For multi-party transaction environments, a plurality of IDLs may be configured and operated to satisfy a range of consumer needs for market analysis, transaction efficiencies, cost containment, buy/sell decisions and the like.

Referring to FIG. 259, an exemplary intelligent data layer 26000 architecture is depicted. The exemplary IDL architecture includes a controlled pipeline of data processing stages that process data from one of a plurality of data sources 26002. The controlled pipeline includes an ingestion stage 26004, an analysis stage 26006, a derived intelligence stage 26008, and an optional publisher stage 26010. The ingestion stage 26004 receives and/or harvests data from one or more of the plurality of sources 26002. Ingestion stage processing may include parsing content of data sources, such as to determine structure, content, relationships among data elements, intended meaning of the data elements, relationships between data, structure, and meaning, and the like. In embodiments, an ingestion facility that may operate at the ingestion stage 26004 may be configured to be aware of data source aspects, such as structure, etc. Ingestion stage 26004 may be preconfigured, such as by an operator of the layer, a platform controller, an intelligent data layer controller 26012, and the like. Configuration of the ingestion stage 26004 may be based on one or more data structures that represent aspects of one or more of the data sources 26002. One such aspect is a location of the data source, such as an Internet or other type of address (e.g., URL, port number, stream identifier, publication and/or broad channel, sensor output location, and the like) from which data may be accessed, queried, pulled, downloaded, streamed or otherwise accessed. Another such aspect of a data source that may be included in a configuration of the ingestion stage 26004 may include an interface method or protocol, such as through an Application Programming Interface, data transfer handshake, Internet Protocol, query language, data block size, access rate (e.g., maximum, frequency, or other timing-related parameter related to accessing the data source) and the like. Yet other aspects of a data source 26002 that may be useful when configuring an ingestion stage 26004 of an intelligent data layer 26000 may include one or more meanings of data from the data source, such as may be represented through a data source ontology and the like. Information such as units, scalars and the like for numerical values provided from the data source may be represented in an ingestion stage configuration data structure. In an example of data sources providing measurement data, a first source may provide numerical values in inches, a second source may provide values in meters, and a third source may provide values in light years. This local data source context may prove useful for relating data sources. In an example of data sources providing reputation rating values, an ontology for each source that establishes a minimum value, maximum value, and increments therebetween provides a way of establishing meaning of a data element from such a source. In yet another example of aspects of a data source that may be usefully applied when configuring at least an ingestion stage 26004 of the intelligent data layer 26000, a data source may impose or be arranged with a geometry/structure that may imbue meaning on data values, relationships among data values, and the like. One exemplary embodiment of a structure that impacts meaning and relationships of data value from a data source is a hierarchical arrangement of the data. When an ingestion facility 26004 is configured to receive/retrieve and process data that is configured as a hierarchy, the ingestion facility 26004 may be configured to assign a relationship attribute to a pair of data values that are configured as parent/child in the hierarchy. Likewise, a rule that may be applied in the hierarchy, such as certain types of changes to a parent data value impacting a corresponding child data value establish an immutable relationship between the data values as they are processed through the ingestion processing pipeline (e.g., ingestion, analysis, and intelligence).

Configuration of the ingestion stage 26004 may be automated, such as through programmatic configuration of data values in an ingestion stage execution data structure. These data values may be retrieved from, for example, an ingestion parameters portion of an IDL data processing data structure 26018. Configuration of the ingestion stage 26004 may be further automated through performing data parsing operations, and the like of data from a data source to determine aspects, such as the exemplary aspects described above. Yet further intelligence functions, such as machine learning may facilitate training an artificial intelligence system to identify aspects of a data source that are relevant for configuring an ingestion stage 26004 to receive and process its data. In embodiments, configuration of an ingestion stage 26004 may be performed at least in part by an intelligent data layer control tower 26012.

In embodiments, an ingestion stage, such as ingestion stage 26004 may develop an understanding of data sources, such as meaning of data values. In embodiments, developing an understanding may be in context of an expected use of data from one or more data sources, such as use of the data for determining a status of a term of a smart contract, a result of a software orchestrated transaction, and the like. Further data from data sources may be understood within a context of other data sources, such as other data sources from which the ingestion stage 26004 receives data. In an example of such understanding, a plurality of marketplace monitors may capture data regarding activity within a marketplace. When data from one of the marketplace monitors is placed in context of marketplace transactions, data from other marketplace monitors may be understood in this context, so that data values associated with transactions within the marketplace may be evaluated objectively against other source data descriptive of the marketplace activity.

The ingestion stage 26004 may further be configured to maintain a schedule of collection activity for one or more of the data sources 26002. A collection schedule may be one of a plurality of aspects associated with ingestion that may be influenced by data sources and by IDL pipeline processing needs (e.g., to satisfy needs of a user of the IDL). Such a collection schedule may be based on a rate or occurrence of availability of new or revised data from a source. In embodiments, some data sources may produce new/updated data on a schedule determined from activities associated with the data source, such as a sample schedule of a sensor and the like. In an example, a business rule for a system that produces data available through a data source may limit data releases periodically (e.g., such as at the end of a work shift, once per day, and the like). In another example of data source-dependent collection activity performed by an ingestion stage 26004, data may be made available based on events, such as completion of marketplace transactions and the like. An ingestion stage may monitor for such events. In an event monitoring example, the ingestion stage may monitor a port on a data network for an indication of data availability at a data source. When the ingestion stage 26004 detects the indication (e.g., a change in a data value of the port), an ingestion process may commence.

Other information of processes related to ingestion may include costs, such as costs to perform data source access, ingestion processing and the like. Cost for data collection may include access fees charged by a data source (e.g., subscription costs, access event costs, demand-based costs, and the like). Costs for data collection may be based at least in part on an amount that a consumer (e.g., a user of capabilities and output from an intelligent data layer) pays for access to information produced by the intelligent data layer that is based at least in part on data from the data source. In an example of consumption-based ingestion fees, an intelligent data layer may ingest and process data from a data source without initial payment to the data source and instead may make payment based on use of the data by consumers of the intelligent data layer. In embodiments, costs to perform data source access may be in the form of a credit to an operator of the intelligent data layer, such as when a data source provides a form of payment for use of its data. There may be a range of cost structures for source data access, at least some of which may be based on data source reputation, relevance of data from the data source, timeliness of updates of the data from the data source, and the like. In an exemplary embodiment, an intelligent data layer may access data from a data source and utilize it a plurality of times to produce layer intelligence for a plurality of users of the intelligent data layer. Costs for access and for the occurrences of use of the accessed data may be different from each other, such as a cost to access may be a multiple of (e.g., 2-time, 10-times and the like) of a cost for each subsequent occurrence of use of the accessed data.

In embodiments, an intelligent data layer may be configured as a component of a producer of source data, so that a corresponding ingestion facility may be owned (and optionally operated) by the data producer. In an example of data source owned intelligent data layers, a data source may retain privacy of its source data by exposing, such as through publication and the like, an output of the owned intelligent data layer, which may include information derived from the source data or select portions of the source data, such as non-confidential information associated with marketplace transactions and the like.

In embodiments, activities of an ingestion stage, such as ingestion stage 26004 may be affected by factors not directly related to a data source (e.g., data availability schedule and the like). Factors that may influence ingestion stage activity may include a determination about why the source data is being ingested. As an ample, an ingestion activity factor may include an arrangement (e.g., a contractual term of a smart contract and the like) between a producer of the content (e.g., a marketplace orchestrator) and a consumer of intelligence derived from the content by the intelligent data layer (e.g., a transactor of the marketplace). In this example, who is producing the data and who is consuming IDL intelligence of the data may influence ingestion activity. When two different consumers have different ingestion requirements for data from a single data source, ingestion activity for the data source may be impacted differently. One basic example is rate of update of source data-based intelligence processing. One consumer may require daily intelligence updates, whereas another consumer may require weekly updates. One consumer may require intelligence based on aggregations of data from a plurality of sources and another may require intelligence based on a single source of the plurality of sources. In these basic examples, ingestion activity for data from a single data source may vary. In addition to different use schedules and multiple source aggregation, a purpose of use of intelligence derived from data from a data source may influence ingestion stage activity. The ingestion stage 26004, optionally directed by the intelligent data layer control tower 26012 may determine that security use of derived intelligence may have a higher priority for ingestion than other uses, such as monitoring shipping status and the like. Higher priority use may influence ingestion activity by, for example, ensuring that ingestion from a source used to generate security intelligence is performed ahead of other lower priority ingestion activities.

Other factors that may affect ingestion stage 26004 activity may be time-constraint based. Factors such as source data validity phases (e.g., data from an access of data from a data source may be tagged with an expiration date), aging factors (e.g., over time an instance of data access may have less relevance), and the like may impact ingestion activity as well as impact other stages of an intelligent data layer pipeline. Ingestion stage (and other pipeline stage) activity may be influenced by other time-constraint based factors, such as collection/availability cycle and related timing. In an exemplary embodiment, a data source may provide access to its data (e.g., via a network port and the like) based on an access schedule, such as a daily access window between 2

AM and 5 AM local time. An ingestion stage 26004 may be configured and/or controlled to ensure to access data from the data source during the access window. Other time-constraint based factors that may impact ingestion activity includes relative timing constraints, such as data availability from a first data source may be dependent on updates to data from a second data source. An example of such a data source availability relationship may be found in a transaction-oriented environment, where data from an inventory data source would be dependent on changes to data in a sales transaction data source. In another example, availability of data from data source providing results of transactions may be dependent on transaction execution timing, settlement timing, a right of last refusal window, and the like associated with a transaction. In these examples, relationships among data sources indicate sequences of ingestion that may be enacted by an intelligent data layer.

Yet further operation of an intelligent data layer 26000, including ingestion operation may also be based on a method of data collection. In embodiments, a data source 26002 may be part of a data supply chain. An exemplary embodiment of a data supply chain may include a physical chain, such as may be embodied by a set of physical sensors (e.g., industrial internet of things sensors) that capture physical activity (e.g., of an industrial machine, and the like) and provide a representation of that activity as a form of data. A physical connection, such as a set of networked devices (e.g., the Internet), may convey the representation of the activity produced by the sensor(s) to, for example, a physical access port (e.g., a networked computer and the like) from which an intelligent data layer may ingest this data. Other types of data collection may include logical supply chains, such as data marts, data marketplaces, aggregated data publishers, and the like. In embodiments, data representative of a physical activity, such as a production machine in an enterprise, may be provided through a physical interface that presents the data from a corresponding sensor as it changes in near real time. That same data may be provided through a logical interface, such as a data base that facilitates access to a plurality of values of data from the sensor, optionally with a capture time, capture sequence and the like to enable batched or delayed use of data from the data source. An ingestion stage 26004 of an intelligent data layer 26000 may be controlled to capture the physical near realtime data, the stored data, or both to meet various needs of the intelligent data layer. In an example, a market maker may utilize intelligence derived from a live feed of commodity pricing data to adjust its bid/ask pricing activity. The market maker may utilize intelligence derived from the stored data values to determine its bid/ask volume activity.

As referenced above, meaning of data from a data source may be relied upon for various intelligent data layer operations, such as parsing source data, generating intelligence therefrom and the like. A data supply chain may turn raw data (e.g., from a physical sensor) into contextual data thereby overlaying meaning based on the context onto the data. An ingestion stage 26004 may adapt operation, such as a parsing operation based on such data supply chain activity. Whereas raw sensor data may be parsed according to a specification for a physical sensor, for example, contextually adapted data may be parsed according to the contextual overlay as well as the raw data definition. As an example, raw sensor data may be accurate to three decimal places, whereas the raw data when contextualized may only be presented with a single decimal place. Raw sensor activity data that records start and stop times of an activity may be accurate to the second, whereas that activity data in a practical context may only need to be represented in whole minutes. In embodiments, the ingestion stage 26004 may apply contextual constraints upon raw data, thereby adjusting at least one aspect of the raw data (e.g., a number of decimal places) based on the context.

In embodiments, the ingestion stage 26004 may be in communication with the intelligent data layer control tower 26012. As noted above, the intelligent data layer control tower 26012 may communicate configuration to the ingestion stage 26004 as well as control all aspects of activity of the ingestion stage 26004. In embodiments, the ingestion stage 26004 may be a set of ingestion and parsing algorithms as well as other ingestion functions described herein that may execute on one or more processors. These one or more processors may comprise the intelligent data layer control tower 26012. In such embodiments, the ingestion stage 26004 may be integrated into the intelligent data layer control tower 26012. Further in such embodiments, the ingestion stage 26004 may execute in virtual containers on, for example, cloud computing systems that are distinct from a physical embodiment of the intelligent data layer control tower 26012.

The ingestion stage 26004 may communicate ingested data, results of ingestion, results of parsing, and the like to the intelligent data layer control tower 26012.

Referring further to FIG. 259, an intelligent data layer pipeline may include an analysis stage 26006 that may receive data from the ingestion stage 26004. The analysis stage 26006 may receive raw ingestion data, adapted ingestion data (e.g., contextually adjusted), data derived from ingestion data (e.g., differences between sequential accesses of a single data source), metadata associated with the ingestion data (e.g., validity window, units, access costs, and the like), and the like.

The analysis stage 26006 may perform various operations on ingestion stage 26004 parsing and other ingestion activity results based on a range of factors, such as comparing data from a plurality of sources for similarity, fitness to a purpose, differences, based on types of data within or across data sources and the like. In embodiments, analysis may include comparing sources against a target use of intelligence derived from a data source. Analysis of ingestion results may attempt to determine if one or more data elements from a data source may meet consumption target requirements, such as meeting a validity time constraint, an accuracy constraint, a frequency of update constraint, relevance to a consumption subject matter focus, and the like. In embodiments, an intelligent data layer may target providing intelligence for buyers of services in a software orchestrated transaction marketplace. The analysis stage 26006 may determine if one or more data elements from one or more data sources 26002 may be relevant for generating intelligence about the services and based on the results of analysis may indicate to the intelligent data layer control tower 26012 to utilize the data for generating derived intelligence. An intelligent data layer 26000 may publish or otherwise convey requests for data, such as types of data, and the like that one or more data sources may attempt to meet. The analysis stage 26006 may determine if ingested data meets requirements of the published request for data, such as if the data complies with one or more parameters in the request.

In embodiments, the analysis stage 26006 may facilitate configuring data in the layer for publication, such as configuring one or more advertisements that characterize the ingested data in terms of potential intelligence value, relevance and the like. Examples include making data, such as derived intelligence data available on a marketplace (e.g., configuring indexing schemes and the like), making the content searchable (e.g., identifying keywords, terms, values, or the like that may facilitate discovery of intelligence derived from the ingested data through use of a search capability. The analysis stage 26006 may facilitate access visibility to information of the intelligent data layer by publishing, communicating, or broadcasting samples of the data over a network, directly to potential consumers and the like. In embodiments, potential consumers of intelligent data layer intelligence and services may include other intelligent data layers, existing data supply chain participants, and the like.

In embodiments, the analysis stage 26006 may suggest, predict, and/or estimate value of ingested data for a plurality of different consumers. These estimates may be used by the control tower to impact intelligent data layer functions, such as IDL intelligence pricing and the like that may be differentiated for different users. Further, such analysis may indicate that intelligence derived from a first data source may be more or less valuable to different target consumers.

The analysis stage 26006 may use feedback from intelligent data layer users regarding, among other things, usefulness of intelligence derived from one or more data sources 26002 to facilitate ingestion and analysis activities and the like. In an example, positive feedback on intelligence derived from a data source may result in communication from the analysis stage 26006 to the data layer control tower 26012 to make use of the data source for deriving other types of intelligence and the like. Feedback handled by the analysis stage 26006 may include feedback from uses of similar data, such as use of data from different sources that may be determined to be similar. In an example, positive feedback regarding use of a data from a first data source may trigger the publishing requests for similar data. Feedback handled by the analysis stage 26006 may be based on similar intelligent data layers.

In embodiments, multiple intelligent data layers may collaborate to meet data consumer needs, such as cross market transaction environments and the like. An analysis stage 26006 of a first IDL (e.g., for producing market intelligence for a product market) may collaborate with an analysis stage of a second IDL (e.g., for producing market intelligence for a service market). In embodiments, IDL collaboration may be enabled through exchange of data, such as by a first collaborating IDL analysis stage producing analysis results that are provided as a data source for a second collaborating IDL.

In embodiments, an IDL may ingest data from a plurality of data sources; each such set of data may be individually analyzed by the analysis stage 26006. However, the analysis stage 26006 may analyze data from a plurality of data sources, such as by aggregating data from the plurality of sources. In embodiments, data from a plurality of data sources may be parsed, such as by the ingestion stage 26004 so that data with similar characteristics (e.g., data that is indicative of a buyer reputation) may be aggregated and analyzed by the analysis stage 26006. Examples of multiple data sources that may provide data with similar characteristics include mobile devices, types of sensors, market-focused transaction systems (e.g., commodity trading, resource exchange, currency exchange markets and the like). In embodiments, the analysis stage 26006 may be in communication with the intelligent data layer control tower 26012. As noted above, the intelligent data layer control tower 26012 may communicate configuration data (e.g., sets of data that enable the analysis stage 26006 to perform various analysis functions) to the analysis stage 26006 as well as control all aspects of activity of the analysis stage 26006. In embodiments, the analysis stage 26006 may be a set of analysis algorithms that may execute on one or more processors. These one or more processors may comprise the intelligent data layer control tower 26012. In such embodiments, the analysis stage 26006 may be integrated into the intelligent data layer control tower 26012. Further in such embodiments, the analysis stage 26006 may execute in virtual containers on, for example, cloud computing systems that are distinct from a physical embodiment of the intelligent data layer control tower 26012.

The analysis stage 26006 may communicate ingested data, results of analysis, information received from an ingestion stage 26004, and the like to the intelligent data layer control tower 26012.

A stage in an intelligent data layer pipeline may include an intelligence stage 26008. An intelligence stage 26008 may utilize artificial intelligence capabilities to develop an understanding about data sources including, among things, uses of data, values of data, applicability of data, collection patterns and relevance to intelligence consumption and the like. Additional intelligence that may be derived by intelligence stage 26008 may include, without limitation, layer specific data relevance, relevance of data from one layer to another, value of intelligence to a consumer, such as to a transactor. In an example, intelligence stage 26008 may derive intelligence useful for forming new marketplaces from transactional data gathered from an existing marketplace.

In embodiments, the intelligence stage 26008 may be in communication with the intelligent data layer control tower 26012. As noted above, the intelligent data layer control tower 26012 may communicate configuration data (e.g., sets of data that enable the intelligence stage 26008 to perform various intelligence functions) to the intelligence stage 26008 as well as control all aspects of activity of the intelligence stage 26008. In embodiments, the intelligence stage 26008 may be a set of intelligence algorithms that may execute on one or more processors. These one or more processors may comprise the intelligent data layer control tower 26012. In such embodiments, the intelligence stage 26008 may be integrated into the intelligent data layer control tower 26012. Further in such embodiments, the intelligence stage 26008 may execute in virtual containers on, for example, cloud computing systems that are distinct from a physical embodiment of the intelligent data layer control tower 26012.

The intelligence stage 26008 may communicate data received from the analysis stage 26006, derived intelligence, and the like to the intelligent data layer control tower 26012.

Referring further to FIG. 259, the intelligent data layer 26000 may include a consumer portal 26010 that may communicate with elements of the IDL pipeline, such as the intelligence stage 26008 from which the consumer portal may receive derived intelligence. The consumer portal 26010 may facilitate access to derived intelligence (and optionally to other data of the intelligent data layer 26000). The consumer portal 26010 may announce availability of derived intelligence to a preconfigured set of consumers and candidate consumers through use of a messaging channel (e.g., SMS messaging and the like). The consumer portal 26010 may announce derived intelligence through various other techniques including, broadcasting across one or more communication channels (e.g., TWITTER™, and the like). The consumer portal 26010 may deliver at least select derived intelligence to intelligent data layer consumers based on a subscription or similar arrangement between the consumer(s) and the intelligent data layer. In embodiments, the consumer portal 26010 may reference (or be provided, such as by the intelligent data layer control tower 26012) intelligence publication configuration data that may identify which consumers are to receive which portion(s) of intelligence derived from which data source and cause the derived intelligence to be provided to (and/or made available to) one or more consumers based on this intelligence publication data. The intelligence publication data may be stored, such as in an intelligent data layer data store 26020 and accessed by the consumer portal 26010 via, for example, an IDL data store access function of the intelligent data layer control tower 26012. The consumer portal 26010 may also communicate with the intelligent data layer control tower 26012, such as to receive configuration, access intelligence data, analyzed data, ingested data and the like.

The consumer portal 26010 may further receive from one or more IDL data consumers, consumer preferences for interfacing with the consumer, requests for updates to previously communicated derived intelligence data, requests for onboarding, feedback on uses of derived intelligence data and the like. In embodiments, a consumer may communicate a derived intelligence delivery schedule to the consumer portal 26010 where it may be combined with other intelligence delivery data, such as other consumer delivery schedules, and the like and utilized by the consumer portal (26010) and/or the intelligent data layer control tower 26012 when performing derived intelligence delivery and communication functions.

An intelligent data layer may include and/or reference an intelligent data layer control tower 26012 that may provide configuration, control, storage, and processing capabilities for the IDL, such as for providing access by an ingestion stage 26004 to ingestion algorithms, facilitating access by a derived intelligence stage 26008 to intelligence services 26014, managing storage of an intelligent data layer configuration data store 26018, managing storage of intelligent data layer ingestion data and outcomes, analysis outcomes, derived intelligence and the like in an IDL data store 26020, and without limitation providing a mechanism by which a user, such as an owner and/or operator of the intelligent data layer 26000 can configure and otherwise interface with the modules of the intelligent data layer. In embodiments, the intelligent data layer control tower 26012 may provide (or provide access to) processing capabilities that may be used by the various stages, such as the ingestion stage 26004, the analysis stage 26006, the derived intelligence stage 26008, the consumer portal 26010, the intelligence services 26014, and the like.

In an exemplary embodiment, the intelligent data layer control tower 26012 may function in cooperation with the ingestion stage 26004 to gather and store ingestion parameters for use when executing various ingestion activities, such as determining availability of newly refreshed data from one of a plurality of data sources 26002 (e.g., a schedule of release of new data or a port address of an indicator of new data status). In embodiments, parsing data may include use of a parsing key set of ingestion parameters and the like. These parameters may be accessed in the intelligent data layer configuration data store 26018.

In another exemplary embodiment, the intelligent data layer control tower 26012 may facilitate access to analysis algorithms by the analysis stage 26006. Further the intelligent data layer control tower 26012 may work cooperatively with an algorithm portal 26016 to receive algorithms for analysis, ingestion, deriving intelligence, and the like. As an example, a data source 26002 may identify and/or provide one or more ingestion algorithms for performing ingestion actions on data provided from the source. The algorithm may be provided through the algorithm portal 26016 received and optionally vetted by the intelligent data layer control tower 26012 and stored in the intelligent data layer configuration data store 26018. In another exemplary embodiment of use of the algorithm portal 26016, a consumer may provide an algorithm for deriving intelligence from data under the consumer's control, such as in a marketplace transaction environment in which a seller provides transaction data as a source of data to the intelligent data layer for processing, optionally with other relevant data, for deriving intelligence associated with seller marketplace activities. In embodiments, deployment of an intelligent data layer as part of a data workflow for an enterprise may involve adapting existing workflow steps with intelligent data layer capabilities. As an example, a purchasing department of an enterprise may have a set of algorithms that are used to process sales forecast data for generating purchasing guidelines. An intelligent data layer may be constructed for the enterprise that produces intelligence regarding the generated purchasing guidelines by utilizing sales forecast processing algorithms that have been uploaded through, for example, the algorithm portal 26016.

In embodiments, the intelligence services 26014 may include a range of intelligence functions and capabilities including, without limitation artificial intelligence functions, machine learning functions, neural network functions, prediction capabilities, and many others. In an example of intelligence services 26014 for an intelligent data layer 26000, an ingestion stage 26004 may provide data from a data source, along with associated descriptive information (e.g., metadata, structural data, ontology data and the like) to a self-learning neural network capability of the intelligence services 26014 to aid in determining an approach to parsing the data source.

Intelligence services may further have access to subject matter associated intelligence, such as cross-market intelligence gathered through processing, optionally external to the intelligent data layer 26000, marketplace configuration, operational, and transaction outcomes for different sets of cross-market offerings. In continuing the example above of use of intelligence services for ingestion, this subject matter intelligence may be applied when a data source is determined to be related to a product or other offering that is similar to products or offerings on which the subject matter intelligence is based. So, if a source of data relates to a product (e.g., mobile device) and subject matter intelligence known to the intelligence services 26014 is based on or associated with mobile device technology, the corresponding intelligence services may be utilized for enhancing/optimizing pipeline operations being performed on the source data.

In embodiments, an intelligent data layer, such as intelligent data layer 26000 as depicted in FIG. 259, may include a user interface 26022 through which a user, such as an operator and the like, may interface with modules of the IDL and the like (e.g., query and maintain data in the parameter data store 26018 or the pipeline data store 26020). The user interface 26022 may facilitate configuring portions of the intelligent data layer, such as the algorithm portal, data retention rules for data stored in the IDL data store 26020, prioritization of use of the intelligent data layer resources by data consumers, and the like.

Referring to 260, an intelligent data layer embodied as an accessible service, such as a service available to the public for accessing intelligence from a range of data sources. In embodiments, the intelligent data layer embodiment of 260 may operate independently to provide intelligence determination services for data consumers. The independent intelligent data layer of 260 may be hired/rented/utilized by a plurality of independent data consumers, such as through payment of a subscription fee, one-time use fee, and the like. In embodiments, the independent intelligence data layer of 260 depicts an entity for producing data for a plurality of data consumers. A micro-service architecture, such as described herein and elsewhere, may further enable isolated and independent processing throughout the layer operating pipeline for each consumer, such as by initiating a virtualized container to perform one or more of the intelligent data layer pipeline functions for each data consumer (e.g., consumer X, Y, Z). In an example, a virtualized container may be operated (e.g., on a cloud processing architecture that has low latency access to data being processed in the container). In embodiments, low latency access here may include, without limitation, local access, such as a data processing server in a networked data storage facility and the like. A virtualized container may be configured with a consumer-specific instance of the ingestion stage 26104. In this example, the consumer-specific instance of the ingestion stage 26104 may be configured with consumer-specific ingestion parameters and/or functions, so as to, for example, listen to certain source data channels 26116 designated and/or selected when configuring the ingestion stage instance for the consumer. In embodiments, an intelligence derivation stage 26108 of the intelligent data layer pipeline may be instantiated in, for example, a virtualized container environment. The instance may be configured with intelligence derivation algorithms associated with a specific consumer, such as data consumer Y 26112.

While data consumer-specific instances of pipeline stage services are described as possible embodiments for the independent intelligent data layer of 260, other architectures are possible and contemplated herein. One such architecture is abstracting (e.g., through use of virtualized containers) use of pipeline stage functions that operate on one or more servers. In this example architecture, a core pipeline stage service may operate on a server with data for a plurality of data consumers being stored in a low-latency data storage facility. In this example embodiment, virtualization facilitates on-demand access to the computing capabilities of the server and more specifically to the computing capabilities and functions of the pipeline stage services, while isolating input data, in-process data, configuration data, and intelligence outcomes so that each consumer appears to have full access to the intelligent data layer based on their needs.

In yet another exemplary embodiment, a plurality of functions of the intelligent data layer may be instantiated within or associated with a virtualized container environment that may be dedicated to providing intelligence services to a specific data consumer or set of data consumers. In this way, ingestion, analysis, intelligence, control tower, storage, and publishing (e.g., producing a data and/or intelligence feed for the specific consumer) may be logically configured within a virtualized environment for providing intelligent data layer services independently of other consumers.

The embodiment of 260 may be differentiated from other embodiments, such as embodiments where an intelligent data layer is integrated into a data consumer (or optionally a data supplier) computing environment.

Data layer processing stage elements 26104, 26106, and 26108 may, for purposes of disclosure efficiency, be substantially, although not exhaustively, as described in corresponding elements 26004, 26006, and 26008 from FIG. 259 respectively. Further, some features of a corresponding stage in FIG. 259 may, in embodiments, be configured differently or excluded from a corresponding stage in 260. As an example, the ingestion stage 26004 may include data conversion capabilities that may be excluded from embodiments of the ingestion stage 26104, at least for instances where those capabilities are not needed, such as when an instance of the ingestion stage 26104 is ingesting data from a source for which at least some types of data conversion are not required.

In embodiments, ingestion stage 26104 may, in addition to interfacing with data sources 26102 (that may be, for purpose of compact disclosure, substantially, although not exhaustively, as described in corresponding element 26002 from FIG. 259) may further interface with data channels 26116 and on-demand data sources 26118. The data channels 26116 may be serviced by an ingestion stage, using, for example, a channel listening function that may be controlled by and/or integrated with intelligent data layer control tower 26120. In embodiments, data consumers may indicate, such as through configuration of the consumption parameters 26122 and the like specific channel(s) of data from which, for example intelligence is desired, or from which data is required for processing in one or more of the intelligent data layer processing pipeline stages based on, for example, configuration data for a consumer-specific instance of the intelligent data layer. A data consumer, such as data consumer X 26110 may indicate that a channel that delivers a stream of transactions within or for an institution or marketplace as a channel source of data from which or in association with which the data consumer desires derived intelligence. As an example, a buyer associated with a transaction marketplace, may desire to be informed, such as through use of the methods and systems of intelligence data layers described herein, of intelligence to be derived from a stream of transaction outcomes provided on a secondary marketplace channel. In this example, the intelligent data layer control tower 26120 may process consumption parameters 26122 to configure a schedule for listening to secondary market transaction outcomes. The consumption parameters for consumer X may, in this example also define one or more of ingestion and/or analysis, and/or derived intelligence algorithms and/or processes to be applied when processing those outcomes along the pipeline (as streamed, in batch or the like as may be specified in, for example, the consumption parameters 26122 for consumer X 26110) via the ingestion stage 26104, the analysis stage 26106, and the intelligence stage 26108. In embodiments, data channels 26116 may also publish data according to a publication schedule. The intelligent data layer control tower 26120 may coordinate the consumption parameters 26122 with each channel's publication schedule so that the ingestion stage 26104 connects with a channel that corresponds to the consumption parameters 26122 contemporaneous with the scheduled publication time. In an example, an instance of the ingestion stage 26104 may be configured to begin listening for data from a specific channel or channels before or at a start of a scheduled publication. Alternatively, the ingestion stage 26104 may be configured and/or activated to begin listening at a point in time relative to the start of scheduled publication, such as after a preamble of the publication, at an initiation of publication of detailed data values, at or near to an end of publication of detailed data values, or after a configurable number of publication steps, and the like.

As noted elsewhere herein intelligence may be derived from source content, structure, and metadata, among other things. In embodiments, intelligence associated with a data channel 26116 may be derived based at least in part on the respective channel's publication schedule. One example of intelligence that may be based on a publication schedule includes awareness of timing of potential changes in data from the channel. Therefore, changes in resulting intelligence may be adapted based on the schedule, such as indicating that intelligence derived prior to a new data publication schedule may be deemed to be "aged" (e.g., weighted lower than more updated intelligence and the like). Time-based averaging of data from such a source may be synchronized with its publication schedule.

As noted herein, another potential source of data may include on-demand data sources 26118. Unlike channels of data, such as data channels 26116 that may publish data on a schedule or based on events or the like, an on-demand data source 26118 may be controlled, such as by the intelligent data layer control tower 26120 to generate (e.g., publish or make available) data when requested. An on-demand data source 26118 may include devices that "sleep" by activating a lower power mode in between requests (demands) for data. While depicted as individual entities, data sources that provide channels 26116 and data sources that provide on-demand data 26118 may not be distinct. A single data source may provide a plurality of data interfaces, including in this example an on-demand interface and a publication channel interface.

The independent intelligent data layer 26100 may include a configuration data storage facility 26122 that may include, among other things, consumption parameter storage for each of a plurality of clients/consumers/users of the layer 26100, such as consumer X 26110, consumer Y 26112 and/or consumer Z 26114 and the like. In embodiments, layer configuration data for a data consumer may be stored separately from the parameter storage 26122 and may be accessed through, for example, a link to the separate configuration data in the parameter storage 26122. Configuration parameter storage facility 26122 (e.g., that may be virtualized and the like) may be configured with data consumer distinct portions to facilitate isolation between users of the layer 26100. A type of configuration parameter that may be accessible in or through the configuration parameter storage facility 26122 may include ingestion parameters, such as for facilitate control of ingestion activities by, for example, the intelligent data layer control tower 26120, an instance (e.g., in a virtualized container) of the ingestion stage 26104 and the like.

The layer configuration storage facility 26122 may be accessed by a data consumer of the data layer 26100 through various computer-to-computer protocols, including networked storage protocols, streaming protocols, indirect access protocols (e.g., through a proxy service that provides access to the storage) and the like.

In the exemplary embodiment of 260, configuration data may include information that facilitates ingestion (e.g., data sources and ingestion controls), analysis (e.g., data source processing, data source relationships, and the like), intelligence (e.g., intelligence algorithms, and/or identification of third-party intelligence services to be used when processing data for the consumer) and the like.

An intelligent data layer 26100 may include and/or have access to artificial intelligence services, such as machine learning services to enhance, among other things, handling of configuration parameters, such as ingestion parameters, data weights and the like that impact operations of the pipeline stages. In embodiments, machine learning 26124 may facilitate processing feedback, such as results of deriving intelligence via the intelligence stage 26108, data analysis outcomes via the analysis stage 26106, ingestion processing (e.g., data parsing and the like) via the ingestion stage 26104 and the like. In an example of machine learning-enabled feedback utilization, a set of consumption parameters (e.g., including a minimum window of time after ingestion of data from a data source 26102) may be adapted based on learning from outcomes of intelligence derived from the ingested data. The feedback may facilitate identifying an impact on the derived intelligence based on an amount of time since last ingestion from the data source. A machine learning system may train the intelligent data layer control tower 26120 ingestion processing control algorithm(s) to, for example, adjust (e.g., increase) the minimum window of time between ingestion events from a data source based on a degree of change in intelligence derived from data ingested from the data source. This learning may reduce ingestion events, ingestion frequency and the like, which can lead to reduced operation costs, while maintaining at least a minimum level of confidence in the derived intelligence. This information may be relayed on to a corresponding consumer, such as consumer X 26110 where ingestion frequency information may be used to further optimize or benefit use of the derived intelligence.

Referring to FIG. 261, an intelligent data layer is depicted as a data strategic approach for an enterprise. The intelligent data layer of FIG. 261 may include several elements that may have commonality with other embodiments herein, such as, without limitation an ingestion pipeline stage 26212, an analysis pipeline stage 26214, an intelligence pipeline stage 26216, an intelligent data layer control tower 26224. While these and corresponding intelligent data layer elements from other embodiments have similarity, there may be some differences that are generally described below.

Overall, a data strategic approach for an enterprise as depicted in FIG. 261 may facilitate deriving intelligence from a plurality of enterprise-specific data sources each with optionally distinct ontologies for meeting data-based intelligence needs and preferences for a plurality of enterprise entities (e.g., department, specific user, user role type, and the like), while taking into consideration enterprise goals, such as goals that are aligned across enterprise entities. Such an intelligent data layer may further facilitate compliance with security requirements, such as user/role-based restrictions on data exposure. One substantive advantage of such a data strategic approach is that intelligence may be derived from sources of data to which a given consumer of the intelligence (e.g., a department, employee, contractor, and the like) does not have access permissions. Another benefit of such a data strategic approach for an enterprise is harmonization of disparate data source ontologies through use of source-specific ingestion and/or analysis metadata. This harmonization may facilitate deriving intelligence from substantively distinct data sources using, for example, a common understanding of some aspects of the data sources. An example may include text data stored in different languages may be harmonized to a preferred common language that may be used for analysis, deriving intelligence, and the like. Many other examples are evident, such as different time zones for different entities of an enterprise, different currencies, and the like.

In embodiments, an ingestion pipeline stage facility 26212 may, using one or more of the exemplary techniques for ingestion of data from one or more data sources described herein ingest data from portions of an enterprise, such as individual departments, business units, field offices, subsidiaries, and the like. These enterprise-centric data sources may be referred to herein as department sources 26202. As noted above, data ontologies, formats, structures, units, and the like may vary from one department source 26202 (e.g., sales) to another (e.g., engineering). The ingestion stage 26212 may be constructed and/or configured to process data ingested from different department sources 26202 using corresponding ingestion parameters that may be updated/utilized on per department source ingestion-event basis. For example, when data is ingested from an engineering department source, ingestion control parameters (e.g., data ingestion rates, content definitions, and the like) associated with the engineering department source may be utilized by ingestion stage 26212 algorithms, circuitry and the like. When ingestion is performed from a sales department source, the ingestion stage 26212 algorithms, circuitry and the like may be adjusted (e.g., reconfigured) to enable ingestion of sales department data. In embodiments, the intelligent data layer control tower 26224 may configure the relevant portions of the ingestion stage 26212 based on the specific department source 26202 from which data is to be ingested. Further, the intelligent data layer control tower 26224 may adapt its internal control of ingestion stage 26212 resources (e.g., computing elements, data communication elements, and the like) based on an indication of one of the department sources 26202 from which data is to be ingested.

In embodiments, the intelligent data layer as a data strategic approach for an enterprise of FIG. 261 may interface with a variety of types of data sources, such as department data sources 26202 described above, on-demand sources 26220 that may be similar to on-demand sources 26118 of the embodiments of FIG. 260, and at least channels, such as periodic report channels 26218 that may be similar to the channels ID-316 of the embodiments of FIG. 260. As noted above not all aspects of the data sources of FIG. 261 (department sources 26202, channel periodic reports 26218, and on-demand source(s) 26220) include all of the functions and features of corresponding elements in other embodiments, such as the corresponding element depicted in FIG. 260 (e.g., sources 26102, channels 26116, and on-demand sources 26118 respectively). An exemplary enterprise embodiment may include periodic reports channels 26218 that are comparable to periodic enterprise reports. Examples include, daily updates of MRP systems, hourly updates of cash flow, weekly sales reports, quarterly profit/loss reports and the like. These examples depict only a few of the wide range of enterprise-specific data sources embodied as the periodic report data sources 26218. Others include without limitation, start/stop of shift production records, quality control periodic reports (e.g., coordinated with production activities), and the like. These data sources may produce updates of data on a periodic basis for use by the intelligent data layer intelligence derivation pipeline. As an example of periodic channel data sourcing, sales figures for each region may be updated and processed by a business data processing system of the enterprise each day between 3 and 5 AM to produce daily sales reports (e.g., by region, sales office, per salesperson, enterprise wide and the like). The intelligent data layer may ingest data from a corresponding periodic report at, for example 5 AM for processing through the intelligence pipeline so that intelligence derived from sales data can be delivered (e.g., published, and the like) as a general broadcast for access by a plurality of intelligence consumers of the enterprise and/or delivered to specific intelligence consumers of the enterprise (e.g., specific department/role, such as role X 26206 and the like). As described herein, ingestion through the ingestion stage 26212 may further based on detecting an indication of newly available data from a data source, such as a periodic report data source 26218. This may exemplarily be performed by a function of the ingestion stage 26212 that samples a port of one or more data sources of the enterprise, for an indication of new data availability. When such an indication is detected, ingestion may commence and/or the intelligent data layer control tower 26224 may be notified, such as through an API of the control tower and the like.

In embodiments, the intelligent data layer control tower 26224 may receive an indication of available ingestion data and initiate an ingestion sequence of events that may include optionally interfacing with one or more intelligence consumers (e.g., depart/role X, Y, Z) for authorization to perform ingestion from the indicated source. Such a sequence may be useful when the corresponding data source (and/or an operator/owner thereof) requires payment (e.g., receiving a credit to an account and the like) when ingestion is performed. In this way, a consumer of intelligence derived from the available ingestion data source (based on the indication of new source data) may optionally authorize or decline performance of the ingestion. The intelligent data layer control tower 26224 may include these and other factors when controlling the layer resources for functions such as ingestion and the like. The intelligent data layer control tower 26224 may further manage ingestion based in an indication of newly available source data by taking into consideration other uses of the source data. As an example, even when a source of data charges a fee for access of its data, the intelligent data layer may ingest the data independent of an authorization by a target intelligence consumer. In this example, the intelligent data layer may be configured to derive and publish intelligence for consumption by intelligence consumers of the enterprise for each indication of available data from a data source and subsequently debit an account of an intelligence consumer (e.g., a budget of department X) for a portion of the ingestion fee when the intelligence consumer receives/accesses the derived intelligence.

Another type of data source for an embodiment of an intelligent data layer as a data strategic approach for an enterprise may be an on-demand source 26220. In embodiments, such an on-demand data source 26220 may be comparable to the on-demand data source 26118 of the embodiments of FIG. 260.

In embodiments, operation of stages along a data intelligence deriving pipeline of the intelligent data layer of FIG. 261 may be influenced by enterprise aligned goals 26204. These goals may be embodied as business rules that may be applied during processing of data in one or more of the stages of the pipeline. As an example, a business rule 26204 for ingestion may indicate that ingestion from some sources should be performed only during non-peak times (e.g., not during regular business hours, not during a time when end of the data reports are being uploaded and the like). Such a business rule may impact ingestion from a corresponding source by adjusting a time of day when ingestion is performed, or a rate of ingestion to avoid overloading the data source during its peak time. Another exemplary enterprise aligned goal 26204 may include performing analysis of ingested data only after adjusting the ingested data for compliance with a data record structure (e.g., number of decimal places). The analysis stage 26214 may react to such a goal by first adjusting data records received from the ingestion stage 26212 to comply with this goal and then performing one or more analysis functions. Another exemplary enterprise aligned goal 26204 that may influence handing of data by one or more of the intelligence derivation pipeline stages may include use of a minimum number of different data sources when deriving some types of intelligence. This may be exemplified by adapting one or more intelligence derivation algorithms to be processed by the intelligence stage 26216 to ensure inclusion of the minimum number of data sources. Another exemplary aligned goal 26204 may specify a maximum amount of historical data to be factored when deriving intelligence. This may be embodied as a maximum number of days of historical data, maximum number of historical ingestion cycles, and the like. Yet another exemplary enterprise aligned goal 26204 for control of the intelligence derivation pipeline stages of an enterprise embodiment of FIG. 26104 is use of artificial intelligence during processing of data. While a specific intelligence algorithm may not impose a constraint to use artificial intelligence, the algorithm may be adapted to use artificial intelligence (e.g., machine learning and the like) based on the aligned goal.

An intelligent data layer control tower 26224 may configure and/or adapt an on-demand ingestion process, such as ingesting data from on-demand sources 26220, based on user-related instructions, preferences and the like. Users of the platform may be users associated with an enterprise for which the Intelligent data layer control tower is configured. The tower 26224 may include an interface to a set of on demand user credentials 26222 that may be referenced when responding to user requests for ingestion and other operations of the system. In embodiments, the user credentials 26222 may inform access privileges and rights for individual users to effect on-demand ingestion and other intelligent data layer functions. In embodiments, the user credentials 26222 may be used to identify specific configurations and/or ingestion activities associated with certain users, certain types of users, certain user roles, and the like. On-demand user credentials 26222 may inform ingestion activities, scheduling, and the like. In an exemplary use of user credentials 26222 the intelligent data layer control tower 26224 may utilize aspects of user credential content to facilitate prioritizing use of on-demand ingestion resources. In this example, a production supervisor may request use of the ingestion capabilities of the system for validating employee payroll contemporaneously with a benefits team looking for benefit cost-trends. In example embodiments, the production supervisor, represented by an entry in an on-demand user credentials data store 26222 may, for this specific request, be designated as having higher priority access to the IDL framework resources than the benefits team member due at least in part to a relationship of the supervisor activity (payroll) to the benefits team member activity (research). This may result in the IDL control tower 26224 organizing the resources of the system to meet the supervisor's information needs ahead of the benefits team member's information needs.

Activities of an intelligent data layer, such as the intelligent data layer depicted in FIG. 261, may further be adapted based on one or more set of rules associated with the layer, such as layer rules for one or more departments, roles, and the like as may be depicted by layer rules 26226. Layer rules 26226 may influence a wide range of layer operations including ingestion, data sourcing, analysis, intelligence derivation, generation of out feeds, use of machine learning, and the like. Layer rules 26226 for a specific department may be prioritized over user-specific layer constraints that may be derived from user credentials 26222. Similarly, enterprise aligned goals that may be embodied as one or more sets of business rules 26204 may be prioritized over department and/or role-associated layer rules 26226. When these and other various sources of rules and the like that may influence an organization, activities, and functionality of the intelligent data layer conflict, such prioritization of rules (e.g., business rules rule over department rules that rule over user credentials, and the like) may be employed by the intelligent data layer control tower 26224 to resolve conflicts.

In example embodiments, an intelligent data layer control tower 26224 may apply department layer rules 26226 when configuring and/or operating an ingestion facility 26212 for handling data sources, such as source of an enterprise for various departments 26202. A department layer rule 26226 may be configured to inform the intelligent data layer regarding limitations of use of data sourced from department X. Such a set of rules may indicate that data from department X is not available for use by members of department Y unless authorized to do so by an authorization agent, such as a supervisor or owner of access rights to department X data. Another such set of rules may indicate that summary data for department X (but not details that contribute to summarizing the data, such as specific entries in department X data, or summarization rules, and the like) may be used freely by any enterprise user with access credentials (26222) that permit use of the intelligent data layer.

In addition to department layer rules 26226 may include role-specific or role-associated data layer rules. Data layer rules associated with a role may be for one or more types of roles in an enterprise (e.g., all human resources personnel, human resource managers, human resource executives, all executives independent of department, and the like). Data layer rules for roles may include rules associated with external roles, such as vendors, regulators, business partners, affiliates, subsidiaries, competitors, smart contract systems, automated transaction systems, and the like. External role data rules may influence a range of operations and data access services available to external users. As an example, a marketplace may use an intelligent data layer to provide access to marketplace data (e.g., activities of the marketplace, financials, and the like). The marketplace may configure an automated transaction system role layer rule that enables access to a subset of the marketplace information, such as transaction type and price, but not participants in the transaction, settlement terms among the participants, and the like. While personally identifying information is one example of information that may not be exposed to certain external roles by a marketplace, the example above suggests that there is a wide range of other, potentially valuable information that may be harvested from marketplace activity that operators (and/or participants) of the marketplace may deem to be excluded from access by external transaction automation systems, for example. Layer rules 26226 may be enforced by the intelligent data layer control tower 26224 in a variety of ways including, without limitation, adapting ingestion services (e.g., ingesting only a subset of information available from a source, limiting a rate or quantity of on-demand ingestion, and the like), applying filters and the like during analysis operations 26214 (e.g., to control generation of analysis outcomes, such as by rounding results to fewer decimal places, removing some results outside of a designated range or timeframe, and the like), adapting intelligence derivation functions (e.g., providing trending content, but avoiding predictions based thereon), and the like.

An intelligent data layer 26200 may include and/or have access to artificial intelligence services, such as machine learning services to enhance, among other things, handling of configuration parameters, such as ingestion parameters, data weights and the like that impact operations of the pipeline stages. These intelligence services may be provided by an intelligence data layer of an enterprise and/or platform with which the IDL is associated. In a converged transactions platform embodiment, configured intelligence services, such as those provided through an intelligence service controller and/or adapted artificial intelligence modules and the like may provide access to a wide range of intelligence and learning capabilities. Therefore, machine learning 26124 may be more fully described by and embody aspects of such configured intelligence services (e.g., as may be provided by a converged transactions platform, a value chain network platform, and the like). In an example, a machine learning/feedback system 26228 may facilitate processing feedback, such as results of deriving intelligence via the intelligence stage 26216, data analysis outcomes via the analysis stage 26214, ingestion processing (e.g., data parsing and the like) via the ingestion stage 26212 and the like. In an example of machine learning-enabled feedback utilization, a set of consumption parameters (e.g., including a minimum window of time after ingestion of data from a data source 26202, channel 26218, or on-demand source 26220) may be adapted based on learning from outcomes of intelligence derived from the ingested data. The feedback may facilitate identifying an impact on the derived intelligence based on an amount of time since last ingestion from the data source. A machine learning system may train the intelligent data layer control tower 26224 ingestion processing control algorithm(s) to, for example, adjust (e.g., increase) the minimum window of time between ingestion events from a data source based on a degree of change in intelligence derived from data ingested from the data source. This learning may reduce ingestion events, ingestion frequency and the like, which can lead to reduced operation costs, while maintaining at least a minimum level of confidence in the derived intelligence. This information may be relayed to a corresponding consumer, such as consumer X 26206 where ingestion frequency information may be used to further optimize or benefit use of the derived intelligence.

In example embodiments, intelligent data layers may include or be associated with a comprehensive data collection and handling system that may be configured with dozens (hundreds, thousands, millions) of probes deployed in data networks, at data sources, listening on many content channels. Each probe may be tunable to "hear" certain types of content, specific content, variances in content, occurrence of events, and the like. In example embodiments, a set of probes may be configured (individually or in groups) to monitor a plurality of news sources for breaking news, such as financial news and the like that may indicate one or more changes to intelligence provided by one or more data layers that relies on financial news, for example. Each probe may individually, or in groups signal one or more intelligent data layer control towers to activate ingestion actions. In example embodiments, intelligent data layer probes may listen to data sources, data users (e.g., consumers/subscribers of data layer intelligence outputs), markets, transactions, and the like.

Referring to FIG. 262, an embodiment of an intelligent data layer combined with remotely deployed intelligence data layer probes is depicted. In general, remotely deployed probes may facilitate dynamic on-demand operation of one or more intelligence data layer functions. Further in embodiments, the intelligence data layer system of FIG. 262 may be embodied as a distributed intelligence data layer where operations, such as ingestion, analysis, and intelligence gathering may be disposed at a plurality of locations, such as at sources of data, at intermediate network components, such as edge computing, on one or more mobile intelligent data layer systems, and the like.

Intelligence data layer pipeline 26304 may include one or more data processing devices, processors, functions, algorithms, and the like as may be described herein for performing, among other things, ingestion from data sources, analysis of ingested source data, and intelligence derivation. Although not described in detail for this exemplary embodiment, aspects of the intelligence data layer pipeline 26304 may be substantially similar to comparable aspects in embodiments herein, such as without limitation the ingestion, analysis, and intelligence services of the enterprise intelligent data layer of FIG. 261, the ingestion, analysis, and intelligence services of the unaffiliated intelligent data layer of FIG. 260, and similar facilities and services of the exemplary intelligent data layer of FIG. 259.

Intelligence data layer probes, such as source probes 26310 may be configured to monitor aspects of sources of data, such as data set states (e.g., for updates and/or other changes or transactions associated with such data sets), data producing or modifying activities of a data source, such as business workflows, transaction systems, and the like, data access factors, such as changes to requirements (e.g., authorization) for accessing one or more sources of data, time-related triggers for data sources (e.g., early release of an update, delayed release of an update, an announcement of new sources, and the like). In a further example of source probes 26310, a probe may be configured to monitor transaction activity in a marketplace against a threshold (transaction counts, rates, value, assets, and the like). When the monitored activity detected by the probe exceeds (or fails to meet) a threshold, one or more corresponding intelligent data layers maybe activated to take an action, such as ingesting data, marking data as out-of-date, and the like.

In example embodiments, source probes 26310 may be configured to aggregate probe monitoring results. As an example, a plurality of source probes 26310 deployed to monitor traffic within a city or other region may collaborate to enable compound trigger conditions, such as to notice changes in traffic patterns that indicate changes in commuting activity. This may include one or more of the probes communicating together to determine that, due to an unmonitored activity (e.g., a traffic jam due to a sink hold), traffic counts in certain roadways are different than typical, for example. In another example, a plurality of source probes may be configured to monitor smart contracts associated with a product or service. These source probes may be deployed with or as part of the product or service and therefore may be dispersed across a geographic region (e.g., across a target market for the product/service). Although these probes may be disparately distributed, the probes may be configured/adapted to aggregate monitoring activity and provide one or more signals to one or more intelligent data layers when the aggregated monitoring indicates a need for action, such as ingestion of data from sources associated with the probes.

In example embodiments, social media probes 26316 may be configured to monitor a variety of social media-centric data, activities, events, and the like. In example embodiments, a social media probe 26316 may be deployed to monitor activity associated with a new product release. A social media probe 26316 may be deployed by a social media creator/influencer to monitor for mentions of his/her name or other identity based on a set of criteria, such as mentions in association with a topic of interest to the creator.

One or more intelligent data layer monitoring probes may be associated with consumption parameters 26322. Such parameter probe 26320 may be configured and/or adapted to monitor consumption parameter activity, such as to detect, for example, changes in one or more consumption parameters. In embodiments, data consumers may indicate, such as through configuration of the consumption parameters 26322 and the like specific channel(s) of data from which, for example intelligence is desired, or from which data is required for processing in one or more of the intelligent data layer processing pipeline stages based on, for example, configuration data for a consumer-specific instance of the intelligent data layer. A consumption parameter probe 26320 may detect such consumer activity and activate one or more processes of the intelligent data layer accordingly. An intelligent data layer consumer, such as data consumer X may indicate that a channel that delivers a stream of transactions within or for an institution or marketplace as a channel source of data from which or in association with which the data consumer desires derived intelligence. As an example, a buyer associated with a transaction marketplace, may desire to be informed, such as through use of the methods and systems of intelligence data layers described herein, of intelligence to be derived from a stream of transaction outcomes provided on a secondary marketplace channel (that may include activation of a channel probe). In this example, an intelligent data layer control tower 26328 may respond to a trigger or other indication by the parameters probe 26320 by processing consumption parameters 26322 to configure a schedule for listening to secondary market transaction outcomes. The consumption parameters for consumer X may, in this example also define one or more of ingestion and/or analysis, and/or derived intelligence algorithms and/or processes to be applied when processing those outcomes along the pipeline (as streamed, in batch or the like as may be specified in, for example, the consumption parameters 26322 for consumer X) via ingestion, analysis, and intelligence derivation. In embodiments, data channels 26312 may also publish data according to a publication schedule. An intelligent data layer control tower 26328 may coordinate the consumption parameters 26322 with each channel's publication schedule so that the ingestion stage connects with a channel that corresponds to the consumption parameters 26322 contemporaneous with the scheduled publication time as may be influenced by a channel probe 26326. In example embodiments, a consumption and parameter probe 26320 may monitor an impact of activity by a machine learning and feedback facility 26324 that may provide feedback, such as suggested changes in consumption parameters and the like.

In example embodiments, consumption probes 26306 may be configured for each of a plurality of intelligence data layer consumers 26308. Consumer probes 26306 may be configured with and/or integrated into one or more aspects of a consumer system, such as an interface between the consumer 26308 and the intelligent data layer 26304. A consumer probe 26306 may monitor, for example, consumer interactions with and uses of data sourced from one or more intelligent data layers. In example embodiments, a single consumer probe 26306 may be configured to notify a plurality of intelligent data layers when certain consumer activity is observed, such as when a consumer accesses data downloaded from the intelligent data layer. A single consumer probe 26306 may be configured with a plurality of monitoring settings to facilitate monitoring a plurality of conditions at a consumer that may be of interest to one or more intelligent data layers. In an example, a first intelligent data layer may provide intelligence and data to a first consumer associated with the first consumer's role as a purchaser in a marketplace. A second intelligent data layer may provide intelligence and/or data to the first consumer associated with the first consumer's role as a seller in a second marketplace. A single consumer probe 26306 may be configured to monitor the first consumer's activities in association with content provided by both the first and second intelligent data layers. The single consumer probe 26306 may signal to the first intelligent data layer based on a first set of monitoring conditions associated therewith and may signal to the second data layer based on a second set of monitoring conditions associated therewith.

In example embodiments, intelligent data layer probes may be configured, activated, deactivated, adapted, and the like through actions of an intelligent data layer control capability such as the intelligent data layer control tower 26328, such as control tower 26224, 26120, 26012 described herein. Actions of an intelligent data layer control tower 26328 that impact one or more deployed probes may be activated by one or more other probes. In example embodiments, a social media probe 26316 may identify activity (e.g., negative reviews) associated with a product (e.g., a health care device) from a particular source (e.g., device manufacturer) in a pool of sources 26302. The identified activity may cause the social media probe 26316 to activate a control tower of a corresponding intelligent data layer to take an action. The control tower 26328 may determine that one such action may include activating a probe that monitors one or more data sources (e.g., purchasing, shipments, customer support activity, and the like) of the device manufacturer. In example embodiments, the control tower may respond to the identified activity by adapting an ingestion scope associated with the corresponding source of data, such as adapting a schedule of ingestion, and the like.

In example embodiments, probes may be activated, distributed, reconfigured, aggregated, triggered for monitoring, and the like based on other activities of the intelligent data layer, such as corresponding ingestion schedules, changes in consumption requirements, parameters, based on machine-learning enabled feedback and the like. As an example, a change in consumption parameters for a source of data to which a source probe is deployed may cause a change in, for example monitoring threshold for data elements being monitored by the source probe. A consumption parameter of a user of the intelligent data layer may deemphasize content coming from a specific source. A source probe associated with the specific source may be reconfigured to monitor for changes that impact a higher percentage (e.g., 20%) of the source data as compared to detecting changes to as little as 5% of the source data prior to the changes in the consumption parameters to deemphasize the source. In another example of operations of the intelligent data layer impacting probe configuration, machine learning may recommend monitoring for changes on a more frequent basis than the frequency of current monitoring. An intelligent data layer control tower may adjust a deployed probe, and/or deploy a replacement probe to perform monitoring more frequently. I this example, a second probe may be deployed that monitors data at the same rate as the first probe but on a different cycle, thereby effectively doubling the monitoring rate. The first and second probes may further be adapted to aggregate their results when determining if an intelligent data layer activation threshold is met.

In example embodiments, a source of data may set a price for use of data provided from the source. Pricing of source data may be a factor that source probes may be configured to monitor. An intelligent data layer control tower may configure a source probe to monitor a price for the data that may trigger ingestion of data from the source. In example embodiments, the source probe may be configured with a compound set of monitoring criteria, such as a target price and an availability window of time that matches one or more consumer criteria of the intelligent data layer.

Operation of one or more intelligent data layers may include and/or be based at least in part on an understanding of relative values of aspects of source data to both a data source provider and an intelligent data layer output consumer. A data producer, such as a marketplace transaction platform, may assign a high value to format of certain content being produced, such as using a streaming format for transaction data. An intelligent data layer consumer may choose to obfuscate the format, focusing instead on timing of certain types of data being produced by the marketplace transaction platform, such as for detecting trading rates and the like. A data producer (e.g., a data source as described herein) may deem that timeliness of data delivery has a substantive impact on a value (e.g., a cost to access the data). For example, data that represents recent activities of the marketplace transaction platform may be priced higher than data representing aged (e.g., historic) activity. A consumer may deem that recent market activity may be less valuable due to the market's dynamic nature, whereas data from prior transaction sessions, now fully settled for example, may represent more stable and therefore more valuable.

The value mapping structure 26402 embodied in FIG. 263 may facilitate developing and/or documenting such understanding of value to producers and consumers. A producer 26404 may consider aspects of data being produced, such as data format(s) 26406, data content 26408, a meaning of the content 26410, a cost of the data 26412, and the like. A consumer 26414 may consider aspects of data used by an intelligent data layer to provide data ingestion, analysis, and intelligence services for the consumer, such as a value of the data 26416, format(s) of the data 26418, timing of the data 26420, and meaning of the data 26422, and the like. Intersections indicated in FIG. 263 between producer aspects and consumer aspects may be populated with one or more values, algorithms, functions, references and the like (e.g., intersection content). Such intersection content may be embodied into one or more functions of a corresponding intelligent data layer. As an example, an intersection of a producer meaning 26410 with a consumer value 26416 may enable applying a consumer's perception of value to one or more meanings of data that may be defined by the producer. In this example, a producer may define a meaning of a set of source data to mean an error rate in surgical procedures that require re-admittance. A consumer, such as an insurer may determine that data with this meaning imputes a high value to the consumer, such as for setting reimbursement to a facility. A higher rate of error that results in readmittance (e.g., with 48 hours and/or based on a determination that the surgical error prompted the readmittance) may be used by the intelligent data layer consumer to withhold reimbursements for certain surgical procedures for a time period that exceeds a likelihood of a patient returning to the hospital due to the error (e.g., at least 48 hours post-surgery). The withhold threshold may be configured into a source probe at the surgical facility that monitors admittances so that when a readmittance occurs, the intelligent data layer may be activated to process the readmittance data for the insurer.

Another example of mapping producer perception of aspect value to consumer valuation may include ascribing a consumer meaning 26422 for a cost of collection 26412 required by a producer. In example embodiments, such a meaning may be within a context of understanding of the consumer. In this example, a consumer may deem that a low cost of collection for certain data maps to a higher tactical/decision meaning than that same low collection cost data means for long-term adjustment to ongoing operations. In another example, a meaning of certain data to a consumer may suggest that the producer demand a higher value than would otherwise be acceptable based on the producer's collection cost of the data. In this example, an intelligent data layer control tower may implement the consumer's meaning as requiring frequent updates by ingesting data from the source frequently. The frequent updates may result in relatively small changes to ingested content. In this context, the intelligent data layer control tower may negotiate a lower cost for each ingestion with the data producer due to the small amount of new data being produced.

Yet another example of mapping producer perception of aspects of sourced data to consumer perception may include determining a relationship between consumer perceived value 26416 and a producer's collection costs 26412. As in the example above, a consumer may highly value certain data from a producer that has a relatively low collection cost. In example embodiments, a producer may set a price for sourcing data that is inconsistent with a consumer's perceived value thereof. A control tower for an intelligent data layer may respond to a determination of this inconsistency by cancelling a scheduled ingestion of the source data, automatically negotiating with the producer for a price that may reflect the consumer perceived value, seeking other sources of data that provide comparable consumer value at lower price, and the like. The control tower may determine this inconsistency by detecting that a consumer-provided content in an intersection of producer cost 26412 and consumer value 26416 reflects this inconsistency. In example embodiments, this inconsistency may include detecting producer cost data in the intersection that may be high compared to other collection costs coupled with a consumer value data that may be low compared to other consumer value entries for other source data, and the like. Further, a consumer may provide a function that enables the control tower to determine this inconsistency by, for example, the consumer may provide target cost data that would be acceptable for use of the producer data. In this example the consumer may provide a maximum target cost data, a target cost with an automatic escalation clause (that maybe administered by a smart contract between the consumer and the intelligent data layer entity), a cost per unit of time (e.g., a maximum amount to be allocated by the intelligent data layer control tower to use of the source of data per day, week, month, and the like).

In yet another example of intelligent data layer operation based on a mapping of provider and consumer perspectives may include operation based on a mapping of a provider perspective of available content 26408 with a consumer perspective on timing of the content 26420. In this example, a consumer may desire access through the intelligent data layer to content, such as content provided by data source X. However, the consumer may identify a timing of use of the content, such as based on a point in time (e.g., an upcoming or recently occurred event), based on a duration of time (e.g., content availability must meet a time-frame condition), and the like. When the desired content X is available outside of the time constraint, the consumer entity may elect to not use the content. Further in this example, a consumer entity may configure a trial period for end users to access intelligence that the consumer derives through the intelligent data layer based at least in part on content X. When an end user activates a trial, the consumer may signal to the intelligent data layer, such as through adjustment of the consumer timing parameter 26420 for the source content 26408 to make use of content X during the trial period. Once the trial period expires, the intelligent data layer may pause ingestion of content X until activated to do so again. In another content-time mapping example, a provider may signal that content is available for use other than between time X and time Y (e.g., outside of a blackout period, such as a blackout period associated with a live sporting event and the like). The consumer that is interested in this access time-constrained content may designate in a representative map 26402 that the content can be used by the intelligent data layer for a duration of time (e.g., a business day) commencing at time Y. In this way, only content that is made available by the source soon after the blackout window would be ingested by the intelligent data layer for use in producing intelligent data layer content (e.g., intelligence derived therefrom) for the consumer.

In example embodiments, an intelligent data layer control tower may use artificial intelligence functions, such as intelligence services that may be provided by a platform (e.g., a transaction marketplace platform and/or system of systems, a value chain network control tower platform and/or system of systems, and the like, to determine a set of operating criteria for each of a plurality of users (e.g., consumer entities) of the intelligent data layer based on analysis of the mapped producer and consumer parameters of parameter map 26402. In example embodiments, an intelligent data layer control tower may have access to a plurality of such maps 26402. As an example, each consumer of the intelligence data layer may be associated with a map.

In example embodiments, an intelligent data layer may learn (e.g., through use of machine learning and the like) configurations of MAP 26402 that may be valuable to one or more candidate consumers. Learning may be based on a plurality of consumer-configured maps 26402. Learning may be based on consumer utilization of data sources, optionally combined with consumer configuration parameters, such as consumption parameters 26322 and the like. The intelligent data layer control tower may speculatively configure the intelligent data layer to produce outputs (e.g., intelligence and the like) based on the learnings of consumer use and mapping 26402 and may offer/market/publish set of data based on the speculative configuration. In example embodiments, an intelligent data layer control tower and/or intelligent data layer entity may publish/market/advertise/offer one or more learned configurations for use by other intelligent data layer entities, such as through a licensing scheme and the like.

Intelligent data layers may be configured to operate in cooperation with enterprise systems. In example embodiments, enterprise systems may include a plurality of modules, such as for distinct departments, subsidiaries, and the like that may benefit from intelligent exchange of information. An intelligent data layer may facilitate information exchange combined with at least entity-specific intelligence that may improve utility and value of information gathered and/or used in such modules. In example embodiments, one or more such modules may include distinct processing systems, locally and/or remotely deployed, and communicating through one or more networks, such as an intranet, an internet, and the like. In example embodiments, an enterprise may include a networked chain of value-contributing entities, such as participants in a value chain network and the like. In example embodiments, a plurality of intelligent data layers may be configured for an entity to achieve one or more objectives of information sharing.

Referring to FIG. 264, embodiments of methods and systems for intelligent data layers implementing entity data-centric strategies are depicted. Enterprises, such as businesses, government agencies, educational institutions, religious institutions, networks of entities, and the like may include a plurality of participants in a data-centric strategy 26510 for the enterprise. Data centric strategy participants may include a range of sub-entities, divisions, departments, bureaus, subsidiaries, locations, franchises, and the like. For simplicity in the exemplary embodiments of FIG. 264, a department 26502 is depicted to represent any and all such participants. While a department of an enterprise may generally be thought of as integral to the enterprise, a department 26502 may not be so constrained; a department 26502 be a separate enterprise in one or more potentially loose and/or transient associations with an enterprise for which the department 26502 is a participant in a data-centric strategy 26510 for the enterprise. Examples may include, two competitive enterprises that have optionally entered an agreement for information sharing associated with a third competitor, a new market, international relations, and the like. A department, such as department 26502 may be distinguished for entity data-centric strategy purposes from external sources merely based on a degree of participation in the strategy. As an example, external sources of data that may provide information, such as external intelligent data layers and the like, that is useful for achieving a successful data-centric strategy, may usefully be differentiated from a department 26502.

In the embodiments of FIG. 264, a department 26502 may receive data from one or more sources, including enterprise-internal sources and other sources. A department 26502 may subscribe to and/or receive information from one or more external intelligence data layers 26504. A department 26502 may be a consumer of information (e.g., data and derived/related intelligence) from the external intelligent data layer 26504. The department 26502 may be a producer of data for one or more external intelligent data layers. Sources of data for a department 26502 may include any such sources disclosed herein, including, for example, one or more data feeds 26506. The department 26502 may participate in an entity data-centric strategy 26510 via one or more internal intelligent data layers through which data, intelligence, and the like may be exchanged. As an example of an internal intelligent data layer between a department 26502 and an entity data-centric strategy 26510, a department may publish content for the strategy that is processed with an input intelligent data layer 26508. The internal intelligent data layer 26508 may be embodied as and/or may include any functionality of any of the intelligent data layers described herein. In an example, an input intelligent data layer 26508 may operate with the department 26502 as a data source and with the strategy 26510 as a consumer thereof.

An example of an internal intelligent data layer between the department 26502 and the strategy 26510 may include an output intelligent data layer 26514 that may operate with the enterprise strategy 26510 as a source of data and the department 26502 as a consumer of the layer 26514.

While a single department 26502 and singular input and output intelligent data layers 26508 and 26514 respectively are depicted in the embodiments of FIG. 264, any number of departments, and any number of input and output intelligent data layers may be configured for achieving an entity data-centric strategy 26510. A single department may generate a plurality of different types of data that may be useful to the entity strategy and processed through a plurality of distinct intelligent data layers. Likewise, a department may consume data from a plurality of intelligent data layers as may be configured for publishing data associated with the strategy. Further although depicted as distinct input and output intelligent data layers, any data layer may operate bidirectionally. Each intelligent data layer, such as 26508 and 26514 may be configured to process and/or provide compound layer intelligence and the like.

A data-centric strategy 26510 may be configured to handle data sharing needs for an enterprise. The data-centric strategy 26510 may include subsets of data associated with operations of the enterprise that are stored locally, such as in the localized data store 26516. A localized data store 26516 may be configured as a single storage facility, a set of distributed storage facilities distributed throughout the organization and connected physically and/or logically through one or more networks, such as an internet, an intranet, and the like. A data centric strategy 26510 may further interface with cloud-based data stores 26512, such as to store data useful and/or pertinent to operation of workflows of the enterprise, including data and intelligence captured from external sources through one or more intelligent data layers, data and intelligence generated in the course of executing workflows of one or more portions of the enterprise, such as the department 26502, data and intelligence produced through one or more intelligent data layers of the enterprise and the like. In example embodiments, a data-centric strategy service of an enterprise may include a cloud-based data store management capability that, among other things, maintains freshness of data and/or intelligence that may be used by one or more portions of the enterprise, such as for performing one or more workflows, and the like. In an example, a set of intelligence content that may be stored in the cloud-based data store 26512 may include strategic pricing predictions for the enterprise. These pricing predictions may be dependent on a range of enterprise-internal data as well as external information, such as fuel costs, shipping costs, currency exchange rates, and the like. In this example the data-centric strategy service may maintain a currency of such pricing prediction intelligence by capturing, such as through intelligent data layers, relevant content including, without limitation, current fuel costs, light crude futures, regional fuel costs, shipping capacity and demand data, shipping costs from contracts with shippers, and the like.

The specifics of how an organization chooses to locally store data may inform structural constraints of one or more intelligent data layers of the enterprise. As an example, an intelligent data layer that accesses locally stored data associated with enterprise from a plurality of distributed data stores may include a plurality of ingestion services that may be tuned to retrieve data from distinct data sources. In example embodiments, ingestion services of intelligent data layers that work cooperative to provide a data-centric strategy for an enterprise may be configured and operated similarly to ingestion services of intelligent data layers described elsewhere herein, such as ingestion services of intelligent data layer 26304 of the exemplary probe-enabled intelligent data layer of FIG. 262, ingestion facility 26212 of the exemplary strategic approach for an enterprise of FIG. 261, ingestion system 26104 of the exemplary independent data layer of 260, ingestion function 26004 of exemplary intelligent data layer architecture of FIG. 259, and the like.

Each intelligent data layer of an architecture to provide data sharing for achieving a data-centric strategy for an enterprise may be configured with a control tower configured to operate the corresponding data layer. An enterprise may be configured with one or more interconnected control towers (not depicted in FIG. 264) that facilitate control of one or more of the intelligent data layers, such as by coordinating operation of the distinct intelligent data layer control towers and/or by controlling one or more of the intelligent data layers independent of a presence of a control tower for a corresponding intelligent data layer.

In the exemplary embodiments of FIG. 264, a data-centric strategy 26510 may employ one or more external intelligent data layer handling facilities 26518 for facilitating use of external intelligent data layers, such as layers that may provide data and/or intelligence based on data from sets of sources that are external to the enterprise. As an example, an industry consortium may operate one or more intelligent data layers that offer industry-impacting data and intelligence to consortium members, and the like. Such an external intelligent data layer may support customized data and/or intelligence production upon request. The external intelligence data layer controller 26518 may adapt requests 26522 that may satisfy one or more data/intelligence needs of the strategy 26510 to configure an external intelligent data layer-specific request.

The external intelligent data layer controller 26518 may be configured to handle a plurality of differently configured external intelligent data layers. Such a plurality of external data layers 26520 may be depicted in FIG. 264 as IDL-EX, IDL-EY, and IDL-EZ. External intelligent data layer IDL-EX may provide data/intelligence based on operations of a value chain network to which the enterprise may be a participant. External intelligent data layer IDL-EY may provide intelligence on consumer buying trends for one or more products/services of the enterprise. External intelligent data layer IDL-EZ may provide data/intelligence on marketplace transactions that may carry products of the enterprise and/or products that are similar to and/or compete with products of the enterprise.

The external intelligent data layer controller 26518 may provide a programmatic interface between external intelligent data layers 26520 and the enterprise strategy 26510, to facilitate, among other things, consolidation of external data layer data/intelligence into a single, optionally composite enterprise input intelligent data layer IDL-EI. The controller 26518 may be configured to make a portion of the plurality of external intelligent data layers to appear to the enterprise as a single intelligent data layer, optionally with composite and/or compound operation. As an example of this capability of the controller 26518, the enterprise strategy may form a request 26522 for data that may not be directly available from a single external intelligent data layer. The controller 26518 may identify relevant potential external sources to satisfy the request 26518, such as a combination of two external intelligent data layers 26520. In this example, the controller may parse the request, thereby revealing that the request includes a first type or domain of data/intelligence (e.g., operations of a value chain network) that may be provided by a first external intelligent data layer (e.g., IDL-EX). Parsing the request may further reveal that a second type or domain of data in the request (e.g., consumer buying trends for one or more products/services of the enterprise) may be provided by a second external intelligent data layer (e.g., IDL-EY). In example embodiments, the controller 26518 may establish a consumer-type relationship with the two external intelligent data layers to receive data and/or intelligence that may satisfy at least the two types of data in the request. The controller may further make at least a portion of the information from the two external intelligent data layers available for use in achieving the entity data-centric strategy 26510. The controller may make the information available by consolidating information it consumes from the two external intelligent data layers into a consolidated data set for use by the entity. The controller 26518 may configure the information consumed from the two external intelligent data layers into a compound intelligent data layer for consumption and use in the data-centric strategy 26510.

Referring to FIG. 265, a configuration of intelligent data layers forming a set of networked data sharing interfaces among a plurality of systems, internet-of-things devices, and the like is depicted. Intelligent data layers may be configured with interfaces that facilitate sharing of data among entities to achieve a wide variety of data sharing services and capabilities. Intelligent data layers may be interfaced with each other to form intelligent networks and/or content channels with one or more physical networks that provide not only raw data transfer capabilities, but also provide delivery and sharing of content and intelligence arranged for a specific consumer, need, or other criteria.

Data sources, such as internet-of-things devices may have limited processing capacity, and or may be configured for purpose-specific operation (e.g., a data sensor and the like). While the information provided by these devices may be rich in a context of its deployment, without the context the information may be less valuable. As an example, a data sensor that puts out a stream of temperature readings may provide valuable and accurate temperature information. However, by itself, this information may be hard to appreciate. Such as what is the temperature information indicative of? Two otherwise identical engines may produce substantively different core lubricant temperatures, such as based on a context of the deployment of the engine. One of the engines may be deployed in an environmentally protective box on a line pole in the Caribbean (thereby indicating a temperature at or near the maximum permitted) and the other may be operating above the arctic circle in winter (thereby indicating a temperature well below the maximum). Merely providing raw temperature sensor data would likely not be sufficient for deriving much intelligence about the engine. However, when the sensed engine temperature is combined with, for example sensed ambient temperature, the resulting intelligence value may be high. By interfacing intelligent data layers, such as exemplarily depicted in FIG. 265, a richness of knowledge and intelligence may result, including increasing available information through combined intelligence services.

The networked intelligent data layers depicted in FIG. 265 facilitate intelligent data sharing among a first IoT device IoTY 26602, a second IoT device IOTZ 26604, a first system, system Z 26606, and a second system, system A 26608. In example embodiments, the networked architecture of FIG. 265 may facilitate transfer of intelligence from the two IoT devices to a first system 26606 and further, optionally incorporating intelligence and/or data produced by the first system 26606 into a set of intelligent data layers consumed by the second system 26608.

Each of IoTZ and IoTY may combine inputs, such as inputs A and B for IoTY and inputs C and D for IoTX to each produce a pair of intelligent data layers, IDL-YA and IDL-YB, for IoTY and IDL-XC and IDL-XD for IoTX. Each of these four intelligent data layers may be combined in pairs to produce composite IoT intelligent data layers, IDL-IoTY for IoTY and IDL-IoTX for IoTX. Yet further, intelligent data layer IDL-IoTXY may be formed from outputs of intelligent data layers IDL-IoTX and IDL-IoTY. In example embodiments, any of these data layers may operate substantially similar to intelligent data layers described herein. As an example, intelligent data layer IDL-IoTX may provide one or more set of outputs, including data, intelligence and the like derived at least in part from information produced by intelligent data layers IDL-XC and IDL-XD. Intelligent data layers IDL-XC and IDL-XD may provide data and/or intelligence based on IoTX inputs C and D respectively. In an example, input C may monitor bidding activity for a marketplace including pricing of bids. Intelligent data layer IDL-XC may ingest and analyze the monitored bidding activity, and further may provide intelligence based on, for example changes in the monitored bidding activity. Input D may monitor settlement activity for completed transactions in the marketplace. Intelligent data layer IDL-XD may ingest and analyze the monitored settlement activity, and further may provide intelligence based on, for example trends in settlement terms. Intelligent data layer IDL-IoTX may ingest the bidding activity change intelligence from IDL-XC along with settlement terms trends from IDL-XD, (and optionally raw and/or analyzed source bidding activity and settlement terms from a corresponding intelligent data layer) to analyze these inputs and deliver intelligence, for example regarding relative impacts of changes in bidding activity on settlement terms as one of one or more outputs of IDL-IoTX.

Monitored information A and B of IoTY may be processed by intelligent data layers IDL-YA and IDL-YB. Outputs from these intelligent data layers may be further ingested and analyzed to produce at least intelligence based thereon by intelligent data layer IDL-IoTY.

A first joining intelligent data layer ILD-IoTXY in FIG. 265 may consume content from intelligent data layers IDL-IoTX and/or ILD-IoTY and deliver at least derived intelligence for consumption by system Z 26606. As an example, system Z may perform regulatory compliance validation for marketplaces being monitored by IoTY and IoTX. IDL-IoTXY may provide intelligence, raw transaction data, and/or analyzed transaction, marketplace, and financial data for a plurality of transactions in the monitored marketplace. System Z 26606 may apply transaction validation rules, such as rules derived from inputs E and F to generate a plurality of types of data, optionally as a set of intelligent data layers including IDL-ZE, IDL-ZF, and IDL-Z. In this example, system Z 26606 may produce intelligent data layer IDL-ZE that provides at least intelligence based on marketplace and/or transaction data derived from intelligent data layer IDL-IoTXY and input E. Likewise intelligent data layer IDL-ZF may provide raw and/or analyzed data and/or intelligence based on validation source data F and content from intelligent data layer IDL-IoTXY. System Z 26606 may further produce an intelligent data layer IDL-Z from native data sources, internal operations, inputs (e.g., E and/or F) and the like. Further, not all potential sources of data for use by system Z 26606 are depicted; however, other sources, including internal, external, and the like are contemplated as aspects of the embodiments of at least FIG. 265.

Further in the embodiments of FIG. 265, intelligent data layer IoTXYZ may be formed to facilitate access by other entities to data, and/or intelligence derived from one or more of IoT device IoTY 26602, device IoTX 26604, and system Z 26606 via intelligent data layer IDL-Z. In example embodiments, other entities that may consume intelligence and the like from intelligent data layer IoTXYZ may include system A 26608. In example embodiments, system A 26608 may further consume data and/or intelligence associated at least with system Z 26606 via intelligent data layer IDL-Z.

In example embodiments, system Z 26608 may ingest content from source G as well as one or both of intelligent data layers IDL-Z, and IDL-IoTXYZ. In the embodiments of FIG. ILD-8, system A 26608 may produce a first intelligent data layer IDL-AG that may be based on information consumed from source G. System A may also produce a second intelligent data layer IDL-AZG that may provide data and/or intelligence derived from source G and one or more of intelligent data layers IDL-Z and IDL-IoTXYZ.

The network of intelligent data layers depicted in FIG. 265 may facilitate access to intelligence provided by system A 26608 (e.g., through intelligent data layer IDL-AZG) that may take into consideration data and or intelligence derived throughout the network and being based on one or more of inputs E and F to system Z, inputs A and B to IoTY, and inputs C and D to IoTX.

Intelligent data layer architectures may include cloud-based variants. Exemplary embodiments of cloud-based intelligent data layers are depicted in FIG. 266. A cloud-based intelligent data layer may be embodied as an accessible service, such as a service available to the public for accessing intelligence from a range of data sources. In embodiments, the cloud-based intelligent data layer 26700 embodiment of FIG. 266 may operate independently to provide intelligence determination services for data consumers. This intelligent data layer may be provided as a service, (e.g., hired/rented/utilized) by a plurality of independent data consumers, such as through payment of a subscription fee, one-time use fee, and the like. In embodiments, the cloud-based intelligence data layer 26700 depicts a distributed set of entities for producing data for a plurality of data consumers. A micro-service architecture, such as described herein and elsewhere, may further enable isolated and independent processing throughout the layer operating pipeline for each consumer, such as by initiating a virtualized container to perform one or more of the intelligent data layer pipeline functions for each data consumer (e.g., consumer X, Y, Z). In an example, a virtualized container may be operated (e.g., on a cloud processing architecture that has low latency access to data being processed in the container). In embodiments, low latency access may include, without limitation, local access, such as a data processing server in a networked data storage facility and the like. A virtualized container may be configured with a consumer-specific instance of the ingestion server 26704. In this example, the consumer-specific instance of the ingestion server 26704 may be configured with consumer-specific ingestion parameters and/or functions, so as to, for example, listen to certain source data channels 26710 designated and/or selected when configuring the ingestion server instance for the consumer. In embodiments, an intelligence analysis server 26708 of an intelligent data layer pipeline of this intelligent data layer 26700 may be instantiated in, for example, a virtualized container environment. The instance may be configured with intelligence derivation algorithms associated with a specific consumer, such as data consumer Y 26720.

While data consumer-specific instances of pipeline services are described as possible embodiments for the cloud-based intelligent data layer 26700, other architectures are possible and contemplated herein. One such architecture includes abstracting (e.g., through use of virtualized containers, and the like) use of pipeline server functions that operate on one or more physical, logical, and/or virtual servers. In this example architecture, a core pipeline service may operate on a server with data for a plurality of data consumers being stored in a low-latency data storage facility. In this example embodiment, virtualization facilitates on-demand access to the computing capabilities of the server and more specifically to the computing capabilities and functions of a corresponding pipeline server, while isolating input data, in-process data, configuration data, and intelligence outcomes so that each consumer appears to have full access to the intelligent data layer based on their needs.

In yet another exemplary embodiment, a plurality of functions of the intelligent data layer may be instantiated within or associated with a virtualized container environment that may be dedicated to providing intelligence services to a specific data consumer or set of data consumers. In this way, ingestion, analysis, intelligence, control tower, storage, and publishing (e.g., producing a data and/or intelligence feed for the specific consumer) may be logically configured within a virtualized environment for providing intelligent data layer services independently of other consumers.

The embodiment of FIG. 266 may be differentiated from other embodiments, such as embodiments where an intelligent data layer is integrated into a data consumer (or optionally a data supplier) computing environment, such as embodiments depicted in FIGS. 266 and 261.

Data layer processing elements, such as ingestion server 26704, analysis server 26706, and intelligence derivation server 26708 may, for purposes of disclosure efficiency, be substantially, although not exhaustively, as described in corresponding elements 26004, 26006, and 26008 from FIG. 259 respectively. Further, some features of a corresponding stage in FIG. 259 may, in embodiments, be configured differently or excluded from a corresponding server in FIG. 266. As an example, the ingestion stage 26004 may include data conversion capabilities that may be excluded from embodiments of the ingestion server 26704, at least for instances where those capabilities are not needed, such as when an instance of the ingestion server 26704 is ingesting data from a source for which at least some types of data conversion are not required.

In embodiments, ingestion server 26704 may, in addition to interfacing with data sources 26702 (that may be, for purpose of compact disclosure, substantially, although not exhaustively, as described in corresponding element 26002 from FIG. 259) may further interface with data channels 26710 and on-demand data sources 26712. The data channels 26710 may be serviced by an ingestion server, using, for example, a channel listening function that may be controlled by and/or integrated with intelligent data layer control tower 26714. In embodiments, data consumers may indicate, such as through configuration of the consumption parameters 26716 and the like specific channel(s) of data from which, for example intelligence is desired, or from which data is required for processing in one or more of the intelligent data layer processing pipeline operations based on, for example, configuration data for a consumer-specific instance of the intelligent data layer. A data consumer, such as data consumer X 26718 may indicate that a channel that delivers a stream of transactions within or for an institution or marketplace as a channel source of data from which or in association with which the data consumer desires derived intelligence. As an example, a buyer associated with a transaction marketplace, may desire to be informed, such as through use of the methods and systems of intelligence data layers described herein, of intelligence to be derived from a stream of transaction outcomes provided on a secondary marketplace channel. In this example, the intelligent data layer control tower 26714 may process consumption parameters 26716 to configure a schedule for listening to secondary market transaction outcomes. The consumption parameters for consumer X may, in this example also define one or more of ingestion and/or analysis, and/or derived intelligence algorithms and/or processes to be applied when processing those outcomes along the pipeline (as streamed, in batch or the like as may be specified in, for example, the consumption parameters 26716 for consumer X 26718) via the ingestion server 26704, the analysis server 26706, and the intelligence server 26708. In embodiments, data channels 26710 may also publish data according to a publication schedule. The intelligent data layer control tower 26714 may coordinate the consumption parameters 26716 with each channel's publication schedule so that the ingestion server 26704 connects with a channel that corresponds to the consumption parameters 26716 contemporaneous with the scheduled publication time. In an example, an instance of the ingestion server 26704 may be configured to begin listening for data from a specific channel or channels before or at a start of a scheduled publication. Alternatively, the ingestion server 26704 may be configured and/or activated to begin listening at a point in time relative to the start of scheduled publication, such as after a preamble of the publication, at an initiation of publication of detailed data values, at or near to an end of publication of detailed data values, or after a configurable number of publication steps, and the like.

As noted elsewhere herein intelligence may be derived from source content, structure, and metadata, among other things. In embodiments, intelligence associated with a data channel 26710 may be derived based at least in part on the respective channel's publication schedule. One example of intelligence that may be based on a publication schedule includes awareness of timing of potential changes in data from the channel. Therefore, changes in resulting intelligence may be adapted based on the schedule, such as indicating that intelligence derived prior to a new data publication schedule may be deemed to be "aged" (e.g., weighted lower than more updated intelligence and the like). Time-based averaging of data from such a source may be synchronized with its publication schedule.

As noted herein, another potential source of data may include on-demand data sources 26712. Unlike channels of data, such as data channels 26710 that may publish data on a schedule or based on events or the like, an on-demand data source 26712 may be controlled, such as by the intelligent data layer control tower 26714 to generate (e.g., publish or make available) data when requested. An on-demand data source 26712 may include devices that "sleep" by activating a lower power mode in between requests (demands) for data. While depicted as individual entities, data sources that provide channels 26710 and data sources that provide on-demand data 26712 may not be distinct. A single data source may provide a plurality of data interfaces, including in this example an on-demand interface and a publication channel interface.

The cloud-based intelligent data layer 26700 may include a configuration data storage facility 26716 that may include, among other things, consumption parameter storage for each of a plurality of clients/consumers/users of the layer 26700, such as consumer X 26718, consumer Y 26720 and/or consumer Z 26722 and the like. In embodiments, layer configuration data for a data consumer may be stored separately from the parameter storage 26716 and may be accessed through, for example, a link to the separate configuration data in the parameter storage 26716. Configuration parameter storage facility 26716 (e.g., that may be virtualized and the like) may be configured with data consumer distinct portions to facilitate isolation between users of the layer 26700. A type of configuration parameter that may be accessible in or through the configuration parameter storage facility 26716 may include ingestion parameters, such as for facilitate control of ingestion activities by, for example, the intelligent data layer control tower 26714, an instance (e.g., in a virtualized container) of the ingestion server 26704 and the like.

The layer configuration storage facility 26716 may be accessed by a data consumer of the data layer 26700 through various computer-to-computer protocols, including networked storage protocols, streaming protocols, indirect access protocols (e.g., through a proxy service that provides access to the storage) and the like.

In the exemplary embodiment of FIG. 266, configuration data may include information that facilitates ingestion (e.g., data sources and ingestion controls), analysis (e.g., data source processing, data source relationships, and the like), intelligence (e.g., intelligence algorithms, and/or identification of third-party intelligence services to be used when processing data for the consumer) and the like.

A cloud-based intelligent data layer 26700 may include and/or have access to artificial intelligence services, such as machine learning services to enhance, among other things, handling of configuration parameters, such as ingestion parameters, data weights and the like that impact operations of the pipeline. In embodiments, machine learning 26724 may facilitate processing feedback, such as results of deriving intelligence via the intelligence server 26708, data analysis outcomes via the analysis server 26706, ingestion processing (e.g., data parsing and the like) via the ingestion server 26704 and the like. In an example of machine learning-enabled feedback utilization, a set of consumption parameters (e.g., including a minimum window of time after ingestion of data from a data source 26702) may be adapted based on learning from outcomes of intelligence derived from the ingested data. The feedback may facilitate identifying an impact on the derived intelligence based on an amount of time since last ingestion from the data source. A machine learning system may train the intelligent data layer control tower 26714 ingestion processing control algorithm(s) to, for example, adjust (e.g., increase) the minimum window of time between ingestion events from a data source based on a degree of change in intelligence derived from data ingested from the data source. This learning may reduce ingestion events, ingestion frequency and the like, which can lead to reduced operation costs, while maintaining at least a minimum level of confidence in the derived intelligence. This information may be relayed on to a corresponding consumer, such as consumer X 26718 where ingestion frequency information may be used to further optimize or benefit use of the derived intelligence.

A cloud-based intelligent data layer architecture, such as architecture 26700 may include communicating information, such as sourced data, intelligence algorithms, intermediate results, results from each pipelined server through a network, such as the Internet. Further intelligent data layer controller 26714 may establish secure channels with and among various other servers of the cloud-based architecture through an Internet to facilitate content sharing, operational control security and the like.

In example embodiments, an ingestion server 26704 may communicate through the Internet and/or other public or private network with data sources, such as source devices 26702, source channel servers 26710, on-demand servers 26712, the internet, and the like to perform ingestion of data used to produce intelligence and the like. An analysis server 26706 may also communicate through the network, such as the Internet to capture, analyze and process content output from the ingestion server 26704. Intelligence server 26708 may interface with one or more other servers of the cloud-based intelligent data layer architecture 26700 through a network such as the Internet and the like. In example embodiments, consumer servers 26718, 26720, and 26722 may be constructed to operate on edge computing servers within the network that are proximal to a home computing system of each of the customers X, Y, and Z respectively.

In example embodiments of a cloud-based intelligent data layer 26700, a customer server, such as customer X server 26718 may optionally be configured to operate on customer X's home server, such as a server on an enterprise network for the customer X and the like. In this way, the aspects of a cloud-based intelligent data layer may be deployed on networked servers that may be proximal to source data and/or consumer computing devices, storage and the like.

Referring to FIG. 267, an embodiment of a multi-use intelligent data layer 25850 that may be used to produce different layer intelligence and content for different purposes across a plurality of intelligent data layer consumers. A multi-use intelligent data layer 25850 may employ an architecture that has some expected similarities with other intelligent data layer architectures described herein, such as a data processing set of stages, referred to herein, in embodiments, as data processing pipeline stages including one or more ingestion stages, one or more analysis stages, and one or more intelligence stages. Each such stage may be embodied as one or more sets of services that may be provided by one or more servers.

To facilitate dynamic multi-tenant use of the intelligent data layer 25850, at least a portion of the pipeline stages may be configured to receive and process data and corresponding parameters for performing its respective pipeline data operations. As an example, ingestion server 25856 may receive source content 25854 and source parameters 25852. One exemplary ingestion processing function includes parsing unstructured content, such as by applying a dictionary for determining relevance and/or meaning of data received from data sources. For such an exemplary ingestion operation, a set of source content 25850 may be received from a source and a corresponding parsing dictionary may be provided contemporaneously with the source content, such as in the form of one or more ingestion parameters 25852. The source parameters, such as a parsing dictionary may be received by the ingestion server 25856 in various forms, including one or more identifiers of corresponding parameters. As an example, a parsing dictionary for ingesting data from source X may be available to the ingestion server 25856 via a link that may be provided in association with source content 25854. The linked parsing dictionary may have been received by the ingestion facility (or via another interface to the intelligent data layer as may be described elsewhere), stored for later use and assigned a link to the stored dictionary that is matched to an identifier known to the ingestion server 25856 to be used for parsing content from source X. As content from source X is received the ingestion server 25856 may reference the stored dictionary via the link corresponding to source X for parsing source content from source X.

In example embodiments, ingestion server 25856 may receive content 25854 and parameters 25852 in association with an ingestion event or action. Ingestion server 25856 may be configured to receive a stream of data from a source Y for the ingestion event. The server may also receive, contemporaneously with this stream (e.g., at an initiation of the stream event) a set of ingestion parameters for processing content in the stream event from source Y. As an example, source parameters 25852 for a stream may include units of measure (e.g., kilometers/hour, percent of a volume, currency exchange rates, and the like) for data values included in the corresponding stream. The ingestion server 25856 may apply the units of measure to data values received in the stream to facilitate conformance of the data value with other content used by the intelligent data layer 25850.

The ingestion server 25856 may be configured to align source content 25854 and source parameters 25852 for each ingestion event during ingestion processing. This may allow the ingestion server 25856 to receive and maintain continuity of source content 25854 and source parameters 25852 from a plurality of sources for application to a plurality of intelligent data layer operations.

A multi-use intelligent data layer, such as intelligent data layer 25850 may further facilitate configuration of an ingestion server 25856 to accommodate a plurality of ingestion scenarios, such as distinct sources, distinct ingestion activities for each source and/or a plurality of intelligent data layer consumers, and the like. In example embodiments, one or more sets of ingestion control parameters 25968 may be created, configured and/or maintained by one or more operation and control processes of the intelligent data layer. Sets of ingestion control parameters may be associated with consumers of the intelligent data layer to facilitate ingestion operations that meet data and intelligence needs of the consumers. As described herein, a consumer may identify ingestion data sources, ingestion schedules, ingestion triggers for on-demand ingestion, and the like. Sets of consumer-specific ingestion parameters may be referenced by a control system for ingestion, such as a control system of the ingestion server 25856 to align ingestion operations with consumer expectations, layer needs, and the like.

The ingestion server 25856 may provide ingested content, optionally including one or more parameters (or information derived therefrom) to use by a data analysis server 25858. The ingestion server 25856 may apply a source-specific dictionary to a set of ingested data to produce a multi-dimensional output that includes data processed with the dictionary and analysis parameters that apply to the ingested content. As an example, a set of ingestion event and/or source-specific analysis parameters derived during ingestion may include information pertinent to a degree of accuracy of the ingested content, such as a number of decimals to which the source content is rounded during ingestion. Other analysis parameters that may be passed from an ingestion server to an analysis server may include ingestion timing related parameters, such as a start and stop date/time for a set of ingested content being forwarded to the analysis server 25858.

Other exemplary embodiments, capabilities, features, services, aspects, functions, constructions, implementations, and variations that may be included with and/or incorporated into ingestion server 25856 may be described in association with ingestion stage 26004, ingestion stage 26104, and ingestion stage 26212.

The analysis server 25858 of the multi-use intelligent data layer 25850 may perform various operations on a result of ingestion server 25856 parsing and other ingestion activity based on a range of factors, such as comparing data from a plurality of sources for similarity, fitness to a purpose, differences, based on types of data within or across data sources and the like. In embodiments, analysis may include comparing sources against a target use of intelligence derived from a data source. Analysis of ingestion results may attempt to determine if one or more data elements from a data source may meet consumption target requirements, such as meeting a validity time constraint, an accuracy constraint, a frequency of update constraint, relevance to a consumption subject matter focus, and the like. In embodiments, the multi-use intelligent data layer 25850 may target providing intelligence for a plurality of distinct buyers of services in a software orchestrated transaction marketplace. The analysis server 25858 may determine if one or more data elements from sources of content 25854 may be relevant for generating intelligence about the marketplace services and based on the results of analysis may indicate to a controller (e.g., a control tower as described herein and the like) for the layer to utilize the source content (e.g., data) for generating derived intelligence. The multi-use intelligent data layer 25850 may publish or otherwise convey requests for content, such as types of data, and the like that one or more content sources 25854 may attempt to meet. The analysis server 25858 may determine if ingested content meets requirements of the published request for data, such as if the content complies with one or more parameters in the request.

In embodiments, the analysis server 25858 may facilitate configuring data in the layer for publication, such as configuring one or more advertisements that characterize the ingested data in terms of potential intelligence value, relevance and the like. Examples include making data, such as derived intelligence data available on a marketplace (e.g., configuring indexing schemes and the like), making the content searchable (e.g., identifying keywords, terms, values, or the like that may facilitate discovery of intelligence derived from the ingested data through use of a search capability. The analysis server 25858 may facilitate access visibility to information of the intelligent data layer 25850 by publishing, communicating, or broadcasting samples of the data over a network, directly to potential consumers and the like. In embodiments, potential consumers of intelligent data layer intelligence and services may include other intelligent data layers, existing value supply chain participants, transaction marketplace participants, and the like.

In embodiments, the analysis server 25858 may suggest, predict, and/or estimate value of ingested data for a plurality of different consumers. These estimates may be used by the control tower to impact intelligent data layer functions, such as IDL intelligence pricing and the like that may be differentiated for different users. Further such analysis may indicate that intelligence derived from a first data source may be more or less valuable to different target consumers.

The analysis server 25858 may use feedback from intelligent data layer users regarding, among other things, usefulness of intelligence derived from one or more data sources to facilitate ingestion and analysis activities and the like. In an example, positive feedback on intelligence derived from a data source may result in communication from the analysis server 25858 to a controller to make use of the data source for deriving other types of intelligence and the like. Feedback handled by the analysis server 25858 may include feedback from uses of similar data, such as use of data from different sources that may be determined to be similar. In an example, positive feedback regarding use of a data from a first data source may trigger the publishing requests for similar data. Feedback handled by the analysis server 25858 may be based on similar intelligent data layers. Feedback handled by the analysis server 25858 may be based on alternate configurations of the multi-use intelligent data layer 25850 that may be activated to provide intelligence services for different consumers.

In embodiments, distinct configurations of the multi-use intelligent data layer 25850 may collaborate to meet data consumer needs, such as cross market transaction environments and the like. An analysis server 25858 configuration for a first use (e.g., for producing market intelligence for a product market) may collaborate with an analysis server 25858 configuration for a second use (e.g., for producing market intelligence for a service market). In embodiments, collaboration across configurations of a multi-use intelligent data layer 25850 may be enabled through exchange of data, such as by a first collaborating configuration of the analysis server 25858 producing analysis results that are provided as a data source for a second configuration of the multi-use intelligent data layer 25850.

In embodiments, the analysis server 25858 may include and/or be configured as a set of analysis algorithms that may execute on one or more processors. These one or more processors may comprise a controller for the intelligent data layer 25850, such as intelligent data layer control tower 26012 depicted and described in association with FIG. 259.

The analysis server 25858 may communicate ingested data, results of analysis, information received from an ingestion stage 25856, and the like to an intelligence server 25864. Results of analysis may include, without limitation, analyzed content 25862, analyzed ingestion and/or analysis parameters 25860, and the like. The analysis server 25858 may receive and analyze parameters received from the ingestion server 25856. This analysis may include adapting, summarizing, reconfiguring, prioritizing, decoding, encoding, filtering, and other types of analysis processes thereby producing a set of analyzed parameters 25860 that may coordinate with analyzed content 25862.

An intelligence server 25864 may provide intelligence services, such as for deriving intelligence associated with and/or based on information received from analysis server 25858 (e.g., analyzed content 25862, and the like). The intelligence server 25864 may utilize artificial intelligence capabilities to develop an understanding about data sources including, among things, uses of data, values of data, applicability of data, collection patterns and relevance to intelligence consumption and the like. Additional intelligence that may be derived by intelligence server 25864 may include, without limitation, layer configuration specific data relevance, relevance of data from one configuration of the multi-use intelligent data layer to another configuration, value of intelligence to a consumer, such as to a transactor, value chain network participant, transaction marketplace participant and the like. In an example, intelligence server 25864 may derive intelligence useful for forming new marketplaces from transactional data gathered from an existing marketplace.

In embodiments, the intelligence server 25864 may be in communication with the intelligent applications 25876. The intelligence applications 25876 may communicate intelligence algorithms, configuration data (e.g., sets of data that enable the intelligence server 25864 to perform various intelligence functions) and the like to the intelligence server 25864 as well as control various aspects of activity of the intelligence server 25864. In embodiments, the intelligence server 25864 may execute one or more of the intelligence algorithms on one or more processors.

The intelligence apps 25876 may be organized to align with individual consumers of the layer so that the intelligence server 25864 may be configured to perform intelligence functions designed to deliver the type and form of intelligence consistent with consumer expectations. In example embodiments, a first intelligence application of the set of intelligence applications 25876 may be configured to work cooperatively with a first set of ingestion control parameters of the plurality of sets of ingestion control parameters 25868 (and optionally a first set of analysis configuration parameters) that, cooperatively configure the intelligent data layer 25850 to ingest, analyze, and derive intelligence to meet data intelligence needs of a consumer, such as consumer X of the set of consumers 25866.

In example embodiments, the intelligence server 25864 may be embodied as one or more intelligence services available from sets of configured intelligence services available for use through a value chain network system of systems and/or an autonomous market orchestration system of systems, and the like. Further each set of intelligence applications of the plurality of sets of intelligence applications 25876 may be embodied as one or more of the configured intelligence services described herein. To make use of such embodied intelligence applications, the multi-use intelligent data layer 25850, such as through programmatic interface variant of the intelligence server 25864 may communicate with intelligence functions of one of the exemplary system of systems described herein. In embodiments, the intelligence server 25864 and at least a portion of the plurality of sets of intelligence apps 25876 may be embodied as one or more intelligence services of such system of systems architectures, including without limitations one or more adapted artificial intelligence modules.

In example embodiments, the multi-use intelligent data layer 25850 may include one or more interfaces 25872 for initiating and/or controlling production of intelligent data layer content for consumers, such as the plurality of consumers 25866. Such an IDL interface 25872 may provide a user interface 25870 through which a user may configure and/or adjust configurations and operations of various portions of the multi-use intelligent data layer 25850. In an example, a user may review candidate data sources as may be suggested by the analysis server 25858 and the like. User review of such candidate data sources may result in acceptance of the source for use by the layer, rejection of the source, or conditional acceptance that is determined during operation of the layer, such as based on consumer ingestion control parameters and the like. The user interface 25870 may provide a wide range of user access, control, and monitoring activities, such as monitoring utilization of the aspects of the multi-use intelligent data layer 25850, configuring access parameters for consumers, responding to requests by consumers for intelligence functions and the like.

The IDL interface 25872 may facilitate interactions between a user and layer aspects, such as ingestion control parameters 25868, ingestion server 25856, analysis server 25858, intelligence server 25864, intelligence applications 25876 and the like. The IDL interface 25872 may further provide a programmatic interface between aspects of the layer with robotic process automation capabilities 25874. In example embodiments, robotic process automation capabilities 25874 may be utilized to automate development of new operational configurations to provide intelligence for new consumers and the like. The robotic process automation capabilities 25874 may identify activities used to configure a plurality of configurations of the layer, determine relevance of such activities to producing certain types of intelligence and the like to facilitate generating automated configuration sets to meet requirements of new consumers and the like. In a robotic process automation example, configuration steps by a user to configure ingestion control parameters, identify preferred content sources, configure the analysis server, actions for arranging intelligence services including configuring intelligence applications and the like for a plurality of consumers may be analyzed by the robotic process automation capabilities to determine at least a recommended sequence of actions to meet intelligent data layer configuration requirements for a new consumer. Likewise, actions that may result in identification and/or validation of new content sources may be automated via robotic process automation.

Intelligent data layers may be configured to provide integral information services to marketplace platforms, such as system of system transaction architectures, transaction environments, and the like to deliver, among other things a high degree of intelligence for market participants and marketplace systems (e.g., including marketplace automation systems, software orchestrated transactions, marketplace owners, and the like). Marketplace platforms may publish intelligent data layers based on marketplace activity. Marketplace platforms may subscribe to intelligent data layers derived from information sources, such as market-centric sources, competitive sources, buyer and seller sources, government and regulatory sources, and a wide range of sources that may be made available for consumption. Buyers and sellers may subscribe to intelligent data layer-based information sources, that support each marketplace platform participant's role. As a buyer participant example, intelligent data layers for buyers may gather and synthesize pricing trends, alternative sellers and offerings (e.g., other products or services) and costs through aggregating data from several sources. As a seller participant example, intelligent data layers for sellers may improve value of a seller's offering to a buyer, revenue to a seller, such as add-ons, cross-market offerings, etc. Financing terms can each be represented by intelligent data layers that supply curated, synthesized data to a seller to facilitate offers, counteroffers, financing options, access to funding, and the like. As a market maker participant example, intelligent data layers may gather and synthesize market impacting data to help, for example, with establishing a companion market in a foreign jurisdiction for a local (regional, national, etc.) market, and the like.

Referring to FIG. 268, an intelligence-enabled marketplace deployment of intelligent data layers is depicted. A marketplace platform 25952 may subscribe to intelligent data layers of market-centric content 25966, such as marketplace regulating sources, marketplace operational sources, such as smart contracts that may impact automating transactions, companion marketplace platform content (e.g., trade and terms information from companion marketplaces and the like), third-party informational services, such as marketplace item curators, item authenticators, and the like. In an example, marketplace platform 25952 may subscribe to an intelligent data layer IDL-MIA (market intelligence input layer A) that may capture transaction-related data from a plurality of marketplaces, such as market pricing data, transaction cost data, and the like. In the example, the marketplace platform 25952 may also subscribe to an intelligent data layer IDL-MIB (market intelligence input layer B) that may capture, analyze, and derive intelligence from after-market activity associated with participants and/or products and services for which the platform 25952 provides transaction services. A set of intelligence services of the platform 25952, such as one or more Configured Intelligence Services described here (e.g., risk analysis intelligence services, machine learning services, digital twin services, and the like) may process information (e.g., raw data, analyzed data, derived intelligence) provided from these market-centric intelligent data layers (25966) to perform various marketplace platform functions, such as transaction cost optimization, regulatory compliance, cross-market service offerings (e.g., for after-market type activity, such as product customization, archival packaging and the like).

In example embodiments, a marketplace platform 25952 may generate a wide range of transaction-related information and may employ intelligent data layers to gain value from this information through, for example, offering preconfigured and/or configurable intelligent data layers to provide data intelligence services based on the generated data. For exemplary purposes, the embodiments of FIG. 268 include a first marketplace platform output data layer IDL-MOA that may be configured to provide optimized and/or include intelligence 25970 suitable for use by marketplace buyers 25954. The marketplace platform 25952 may further include a second marketplace platform output data layer IDL-MON that may be configured to provide optimized for an/or include intelligence 25972 suitable for use by marketplace sellers 25956. The marketplace platform 25952 may yet further include a plurality of marketplace platform output data layers (e.g., IDL-MOB, and the like) that may offer to third-parties actionable information and intelligence about the platform and optionally about transactions occurring on the platform. In an example, after-market service providers (e.g., extended warranty and the like) may subscribed to a third-party oriented intelligent data layer to detect transaction information useful for providing extended warranty (or other) services. Third-party oriented intelligence provided through such an intelligent data layer may include information that goes beyond transaction outcomes, such as seller offer trends (which products are sellers more likely to be offering), buyer trends (what types of products are buyers coming to the platform looking to purchase), correlations between ingested market-centric intelligence (e.g., third-party services being provided to buyer/seller participants of the platform) and platform transaction metadata (e.g., costs of transactions, financing of transactions), and the like.

A marketplace platform, such as platform 25952 may be integrated into and/or be associated with an automated market orchestration system of systems as described herein. The marketplace platform 25952 may rely on intelligence and other services of the automated market orchestration system of systems to provide output intelligence data layers, such as third-party relevant intelligence data layer IDL-MOB, through analysis and intelligence derivation from one or more sources of marketplace platform information. To produce, for example, a seller-centric output intelligent data layer IDL-MOA, the platform 25952 may interface with an intelligence module controller and related intelligence services (e.g., machine learning, robotic process automation and the like) to harvest, analyze, and derive seller-related information services that can be consumed by seller participants 25956 of the platform marketplace 25952. Seller-focused intelligence data layer, such as IDL-MON that produces seller intelligence 25972 may be useful to improve value of a seller's offering to a buyer, increase revenue to a seller, such as through inclusion of add-ons, enable cross-market offerings among sellers, and the like.

Market platform participants may include sellers 25956 and buyers 25954. Participants may subscribe to intelligent data layers to facilitate their participation in the marketplace, such as by getting advanced information and intelligence about items relevant to them. A seller 25956 may subscribe to a plurality of seller-centric data sources 25962 through a plurality of intelligent data layers 25964. These seller-centric intelligent data layers 25964 may be configured and/or include features and capabilities of intelligent data layers described herein, such as, without limitation 26000 of the embodiments of FIG. 259.

Seller entities, such as seller computing systems and the like may interface with one or more of these seller intelligent data layers through programmatic computer-to-computer interfaces, such as Application Programming Interfaces and the like, including those described in association with intelligent data layers described herein, such as the API 25906 of intelligent data layer 25904 of the embodiments of FIG. 258. Seller entities 25956 may subscribe to or otherwise access content from the seller-centric intelligent data layers 25964 similarly to intelligent data layer consumers described herein, including without limitation consumers 26308 of the embodiments of FIG. 262. Seller intelligent data layers 25964 may be configured as described herein to meet one or more information and/or intelligence needs, desires, interests, priorities, preferences, and the like of one or more sellers 25956. A seller intelligent data layer of the set of intelligent data layers 25964 may be configured to provide real-time intelligence and information regarding currency exchange rates (e.g., cross-national currencies, cryptocurrencies, and the like) that may facilitate use of analytics and the like by a seller entity to adapt transaction pricing, parameters, and the like. As an example, if a current exchange rate suggests potentially greater value to a seller who makes those transactions today, the seller may adjust terms of items in the marketplace, offering a bonus (e.g., lower price, extra services, free item) for buyers who perform an instant payment transaction and/or increases costs to a buyer who defers payment transaction into the future.

A buyer 25954 may subscribe to a plurality of buyer-centric data sources 25958 through a plurality of intelligent data layers 25960. These buyer-centric intelligent data layers 25960 may be configured and/or include features and capabilities of intelligent data layers described herein, such as, without limitation 26000 of the embodiments of FIG. 259.

Buyer entities, such as buyer computing systems and the like may interface with one or more of these buyer intelligent data layers through programmatic computer-to-computer interfaces, such as Application Programming Interfaces and the like, including those described in association with intelligent data layers described herein, such as the API 25906 of intelligent data layer 25904 of the embodiments of FIG. 258. Buyer entities 25954 may subscribe to or otherwise access content from the buyer-centric intelligent data layers 25960 similarly to intelligent data layer consumers described herein, including without limitation consumers 26308 of the embodiments of FIG. 262. Buyer intelligent data layers 25960 may be configured as described herein to meet one or more information and/or intelligence needs, desires, interests, priorities, preferences, and the like of one or more buyers 25954. A buyer intelligent data layer of the set of intelligent data layers 25960 may be configured to provide real-time intelligence and information to a buyer of the set of corporate buyer entities 25954, such as changes in corporate strategy (e.g., acquisition/merger insight), updated corporate buying procedures (e.g., information and intelligence on how changes in buying procedures can best be reflected in current transaction activities), corporate sales outlook (e.g., to facilitate adjustments in delivery timing and deferral), cash flow of the corporation (e.g., ability to offer to pay cash and reduce pricing), available financing options (e.g., status of corporate lines of credit), and the like.

Buyers 25954 and sellers 25956 participants in the marketplace platform 25952 may benefit from marketplace contextual updates. However, buyers in the set of marketplace buyers 25954 and sellers in the set of marketplace sellers 25956 may develop independent a marketplace context consumer profiles that maybe configured into a marketplace intelligent data layers IDL-MFB (buyer) and IDL-MFS (seller). In example embodiments, marketplace contextual information 25970 from a marketplace output intelligent data layer IDL-MOA may be adapted by a first instance of the buyer intelligent data layer IDL-MFB for a first buyer (e.g., a corporate buyer) and may be adapted differently (at least in part) by a second instance of the buyer intelligent data layer IDL-MFB for a second buyer (e.g., a non-profit buyer) to enrich an experience and/or performance of each such buyer in the set of buyer participants 25954. Likewise, marketplace contextual information 25972 from a marketplace output intelligent data layer IDL-MON may be adapted by a first instance of the seller intelligent data layer IDL-MFS for a first seller (e.g., a corporate seller) and may be adapted differently (at least in part) by a second instance of the seller intelligent data layer IDL-MFB for a second seller (e.g., a non-profit seller) to enrich an experience and/or performance of each such seller in the set of seller participants 25956.

Intelligent data layers may play a role in developing new sources of content for enriching utility, value, and relevance of the types and extend intelligence that these layers provide. Source discovery, vetting, and integration are among a plurality of services and capabilities intelligent data layers may provide. The embodiments depicted in FIG. 269 may include intelligent data layer source discovery. An intelligent data layer control tower 26062 may be configured with and/or include access to artificial intelligence capabilities including machine learning and the like. When an intelligent data layer 26050 with the intelligent data layer control tower 26062 depicted in FIG. 269 is deployed with and/or integrated into a marketplace system of systems, such as an automated market orchestration system of systems described herein (and/or optionally a value chain network) an array of intelligence services may be made available for use in source discovery and the like.

The intelligent data layer control tower 26062 may be configured to configure, operate, and optimize execution of source discovery functions, such as an ingestion capability server 26056, an analysis server 26058, and the like. In an example of source discovery, the intelligent data layer control tower 26062 may direct the ingestion server 26056 to capture information from and/or about candidate sources 26052. In this example, the control tower 26062 may direct an advertising function of the ingestion server 26056 to advertise one or more requests for content that may be useful to the intelligent data layer 26050. The ingestion server 26056 may contact a plurality of known content sources with sets of criteria that may be descriptive of a type of content desired. The ingestion server 26056 may explore, e.g., through web crawling, crowd sourcing and the like, potential sources of data that may comply with the sets of criteria. In example embodiments, the ingestion server 26056 may identify a set of criteria that is descriptive of a current data source used by the intelligent data layer 26050. The ingestion server 26056 may adapt the criteria (e.g., adjust a range of descriptive value, broaden the criteria by abstracting one or more requirements, vary presence of different aspects of the criteria) and seek for potential sources of new content.

The intelligent data layer control tower 26062 may use artificial intelligence to develop suggestions for source content criteria, such as based on analysis of existing sources, based on requests for variation of intelligence from consumers of the intelligent data layer, feedback relating to usefulness of existing sources, and the like. These developed suggestions may further include references to source meta data, such as data format, unit of measure, jurisdiction, access criteria, access costs, content availability, content use terms, and the like. Using any of a range of content discovery methods, including those described herein, the ingestion server 26056 may capture content from one or more candidate sources 26052 that may meet at least a portion of the source discovery criteria. In an example, the ingestion server 26056 may be tasked with capturing content from mobile devices associated with an enterprise, such as mobile phones configured to interface through secure means (e.g., a virtual private network) with external sources. In another example, the ingestion server may adapt an ingestion profile for one or more existing sources, such as to permit ingestion of content that may have been excluded from ingestion under the original ingestion profile.

Data collected from candidate sources 26052 via the ingestion server 26056 may be vetted for compliance with at least a portion of a target new content ingestion criteria, such as complying with a data format, a language, a minimum precision, and the like. The ingestion server 26056 may pass (e.g., stream and/or store for separate access) acceptable content to the analysis server 26058. The ingestion server 26056 may also provide source discovery status information to the intelligent data layer control tower 26062, such as source location information (country, jurisdiction, URL, domain, and the like) at least for sources for which content has been passed along to the analysis server 26058. In example embodiments, the ingestion severs 26056 may maintain a list, directly and/or through interaction with the intelligent data layer control tower, of candidate sources accessed and their status. The ingestion server 26056 and optionally the intelligent data layer control tower 26062 may rely on this source status for future source discovery activity. As an example, if a result of widening an ingestion profile for an existing data source X results in little or no data that meets a minimum set of target source discovery criteria, then a record of the existing source X could be updated to reflect the relevance (or lack thereof) to the desired content. When another source discovery activity is performed, the source relevance records may be examined before seeking to pursue different content from this particular currently approved source.

In example embodiments, an analysis server 26058 may be configured to evaluate content ingested from a new candidate source for meeting one or more aspects of a target new data source discovery criteria. As an example, criteria for a new source may include consistency of terminology (content) in the source and optionally consistency of terminology to existing terminology used to process ingested content. In example embodiments, the analysis server 26058 may be artificial intelligence-enabled, which may facilitate use of various artificial intelligence analysis techniques. An example analysis may involve performing a recursive operation on data values to determine if the data approaches zero (indicating that the day may meet a stability criteria), or if the data does not exhibit a minimum degree of stability. The range of potential analysis techniques here are essentially unbounded; however, for any given analysis activity of a candidate source, it is likely that a set of criteria for a target use of the data may be used to identify a subset, optionally a small subset of analysis actions to take on the data.

For content that meets an acceptability criterion based on a result of analysis operations on the ingested candidate source data, additional candidate source data vetting steps may be applied. In the example embodiments of FIG. 269, similarity of such candidate source data to existing source data 26054 may be determined, such as via a similarity server 26060. The similarity server 26060 may evaluate new content source data against the existing source data 26054, potentially performing one or more comparisons to determine if the new content source data may provide a meaningful contribute to increase intelligence capabilities of the layer. In example embodiments, the similarity server 26060 may determine similarity of candidate source data by generating one or more values that capture at least one degree of similarity 26064. The similarity server 26060 may determine that data values in the candidate source may be too similar to existing sources and therefore may indicate that in the degree of similarity 26064. IN an example, an intelligent data pipeline may facilitate monitoring operation of an automated welding station. A candidate source of data may include additional temperature sensors on the station. If, upon analysis and similarity comparison, the candidate source temperature values add no substantive new information, the source may be deemed to be lacking in usefulness. For instance, the additional sensors provide a temperature of a welded piece immediately before welding. However, a current temperature sensor provides information that permits determining this indirectly because it reports an ambient temperature proximal to the piece to be welded, which suggests that temperature data from the candidate source(s) does not provide sufficient new information to meet the usefulness criteria.

Based on this degree of similarity 26064, an estimate of relevance and/or utility may be generated by a utility/relevance server 26066. The estimate of relevance may be expressed as a degree of usefulness 26068. An example degree of usefulness 26068 may include a predicted impact on intelligence that may be derived when data from the candidate source is used by one or more intelligence derivation algorithms, examples of which are described herein. If a degree of usefulness 26068 meets a usefulness criterion (e.g., facilitates generating intelligence based on new types of data sources), the intelligent data layer control tower 26062 may add the candidate source to a list of approved sources by issuing a source decision 26070. If the degree of usefulness 26068 does not meet the usefulness criteria, the intelligent data layer may issue a support decision 26070 that instructs the ingestion server 26056 to ignore the candidate source, at least temporarily for the current instance of source discovery. A candidate source may not meet usefulness criteria if, for example, intelligence results from use of the candidate source data are outside an acceptable range. As an example, intelligence derived from existing sources may include a desired range of trend values. If intelligence algorithms applied with the candidate source data results in generation of trend values outside of the desired range, the usefulness may fall short so that the candidate source may be excluded in the source decision 26070.

Data and Networking Pipeline for Market Orchestration

Figure 270:
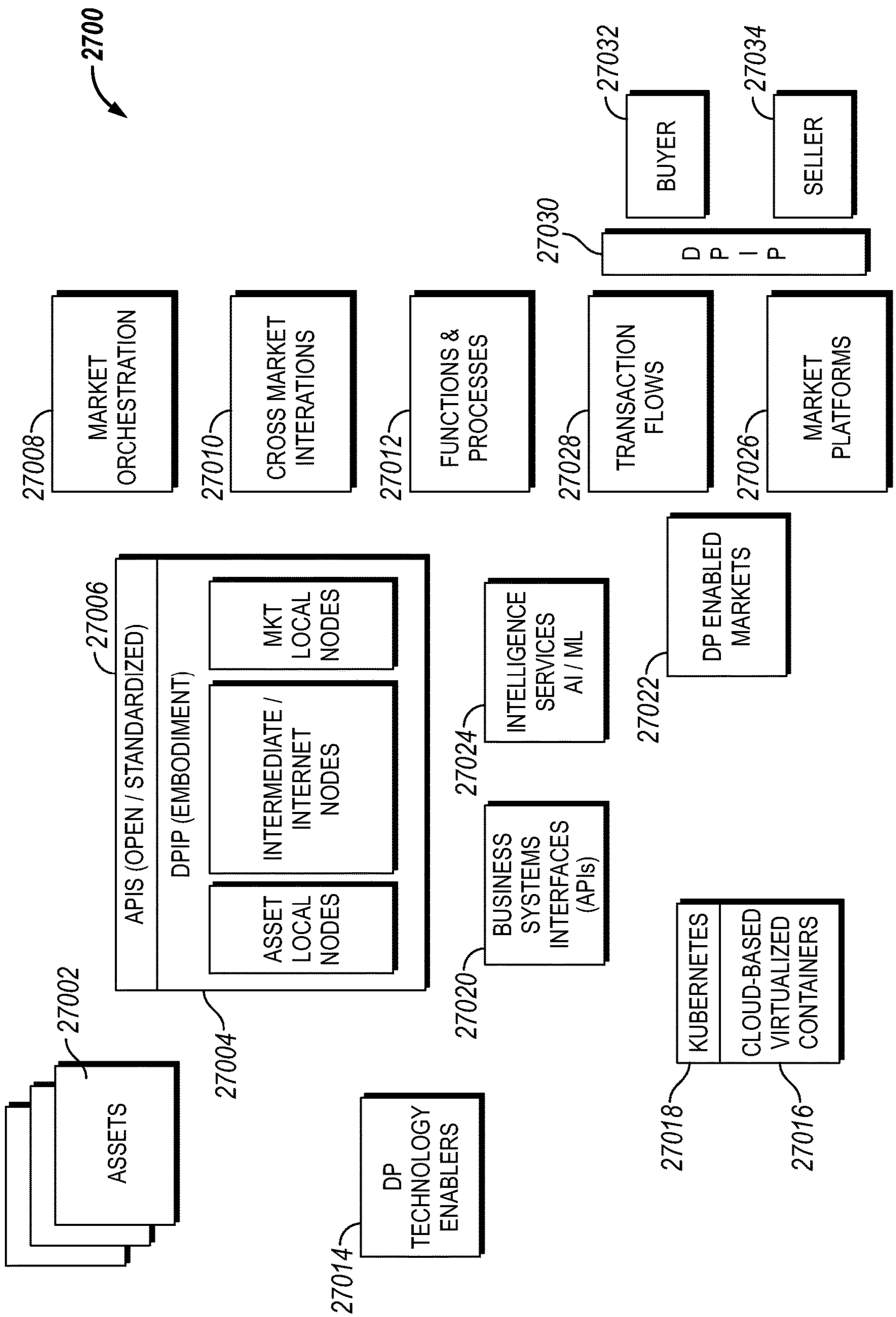

Referring to FIG. 270, a block diagram of exemplary features, capabilities, and interfaces of an exemplary deployment environment 27000 of a data and network infrastructure pipeline 27004 is depicted. Data network and infrastructure pipelines may be configured as a portion (or portions) of one or more transaction platforms. The exemplary embodiment in FIG. 270 depicts a data network and infrastructure pipeline 27004 characterized with at least one each of a set of asset-centric intelligent network resources, a set of intermediate intelligent network resources, and a set of market-centric intelligent network resources (optionally including a set of asset entities, a set of marketplace entities, and associated controllers) interconnected for providing asset data and asset data-derived content (e.g., intelligence) from, for example one or more set of assets 27002. Exemplary embodiments of 27004 are depicted and described elsewhere herein. Associated with the exemplary data network and infrastructure pipeline 27004 of FIG. 270, assets 27002 may represent one or more sources of asset information, such as business data, sensor data, outputs of portions of other pipelines, virtual data, and the like to which data network and infrastructure pipeline processes may be applied. In an exemplary transaction platform deployment of data network and infrastructure pipeline methods and systems, which is described elsewhere herein in greater detail, asset data 27002 may be applied through the data network and infrastructure pipeline 27004 to impact transaction outcomes, buyer and/or seller operating environments, market data, and the like, typically through configuring one or more marketplace parameters for conducting marketplace workflows for transactions of the assets.

In embodiments, a data network and infrastructure pipeline, such as 27004 may be configured with or operationally connected to a set of application programming interfaces (APIs) 27006 through which, among other things, asset data may be retrieved and/or received. In exemplary embodiments, an API 27006 for a data network and infrastructure pipeline may be an open/standardized API 27006 (e.g., banking/financial institution open APIs) that, among other things, may equip the data network and infrastructure pipeline 27004 for integration with and into current and emerging ecosystems. Use of open/standardized APIs 27006, while optional for some data network and infrastructure pipeline embodiments, may further enable these pipelines to integrate into a wide range of transaction workflows, such as corporate internal workflows, inter-jurisdiction transaction workflows, and the like.

A data network and infrastructure pipeline such as 27004 may include, reference, and/or provide market orchestration elements 27008 that may facilitate use of data network and infrastructure pipeline capabilities for various aspects of market orchestration, including, without limitations, software orchestrated transactions, software orchestrated marketplaces, and the like. Market orchestration elements 27008 may facilitate deployment of a data network and infrastructure pipeline, such as a web service embodiment, as an integrated function of a market orchestration platform, such as an automated market orchestration system of systems as described herein. In embodiments, a data network and infrastructure pipeline may provide data and network pipeline capabilities for market orchestration when configured as a portion of a data network and infrastructure pipeline 27004 in association with market orchestration elements 27008 and the like.

DP environment 27000 may include, reference and/or provide cross market interaction capabilities 27010 that may enable leveraging data network and infrastructure pipeline principals, computation capabilities, storage and data sourcing capabilities, as well as intelligence capabilities for cross market interactions. Cross market interaction capabilities 27010 may include interfaces to one or more marketplaces, transaction environments, and the like, so that, among other things, a data network and infrastructure pipeline may be configured with assets from one market in a cross-market integration deployment as a source of data and with another market in the cross-market integration deployment as a target recipient of the data network and infrastructure pipeline services. In embodiments, a similar arrangement may be constructed between two or more markets so that asset data in either market can be used as a data source and can be influenced by asset data from another market. Cross market interactions 27010 may be accomplished through one or more market-to-market data network and infrastructure pipelines for intelligent exchange of asset data among markets, such as data about assets of buyers in one market and about assets of sellers in another.

In the exemplary data network and infrastructure pipeline embodiment of FIG. 270, functions and processes 27012, for an exemplary market-oriented deployment may include software-oriented transaction functions and processes, automatic transaction transactions and processes, and the like. Functions and processes 27012 for a data network and infrastructure pipeline 27004 may include signaling availability of data (e.g., emergence of an occurrence of asset data) that impacts data provided to a transaction operator from (for example) a data and network infrastructure pipeline. Other exemplary functions and processes 27012 may include embedding network adaptability capabilities into smart contracts, tokens, publishing data on a schedule, or other occurrences (e.g., an initiation of a smart contract and the like). Yet other functions and processes may include payments between/among machines and the like.

In embodiments, a data network and infrastructure pipeline may include and/or be associated with data and network infrastructure pipeline technology enablers 27014, such as 5G networking, artificial intelligence, visualization technology (e.g., VR/AR/XR), distributed ledger, and the like.

In embodiments, a data network and infrastructure pipeline 27004 may include and/or leverage cloud-based virtualized containerization capabilities and services 27016, such as without limitation a container deployment and operation controller, such as Kubernetes 27018 and the like. Cloud-based virtualized containers may facilitate data network and infrastructure pipeline smart network resources being deployed close to asset data, thereby potentially reducing network bandwidth consumption or the potential for network disturbances in a data workflow and without substantive investment in infrastructure by the data network and infrastructure pipeline operator and/or consumer.

The data network and infrastructure pipeline of FIG. 270 may further include business system interfaces 27020, such as APIs and the like that facilitate adoption of data network and infrastructure pipelines by enterprises for development, among other things of a data-centric business workflow environment that enables cross-functional data use, seamless aggregation, and immediate contextualization of corporate data for individual departments, enterprise, subsidiary, and the like. Further integration of aspects of the data network and infrastructure pipeline into enterprise systems may include integration with one or more enterprise databases and the like.

Data network and infrastructure pipeline enabled markets 27022 may be enabled by and/or enhanced through the adoption of data and network infrastructure pipeline technology. Markets, such as markets at an intersection of financial service and physical product offerings may be revealed and/or enabled through application of these pipelines to help parse, analyze, and provide intelligence for a wide range of market-impacting and/or related assets. These emergent markets may be substantively constructed as a result of intelligence gathered by use of data network and infrastructure pipelines within or in association with individual markets, and the like.

Technologies that may be provided by and/or enabled by a data network and infrastructure pipeline 27004 may include intelligence services 27024, such as artificial intelligence, machine learning and the like. These intelligence services 27024 may be provided in the environment 27000, or accessed (e.g., as third-party services) via one or more interfaces of the environment 27000. The data network and infrastructure pipeline embodiment 27004 may be provided access to these intelligence services 27024. One or more data network and infrastructure pipeline embodiments 27004 may bring to the platform its own set of intelligence services, which may be dedicated to the host data network and infrastructure pipeline, or may be shareable among linked pipelines, for example.

In the exemplary embodiment of FIG. 270, transaction/market-oriented capabilities, services, and deployment may include market platforms 27026, transaction flows 27028, buyers 27032, sellers 27031, and transaction/marketplace specific data network and infrastructure pipelines that enrich transactions, transaction services and the like 27030. For multi-party transaction environments, a plurality of data network and infrastructure pipelines may be configured and operated to satisfy a range of consumer needs for market analysis, transaction efficiencies, cost containment, buy/sell decisions and the like.

Figure 271:
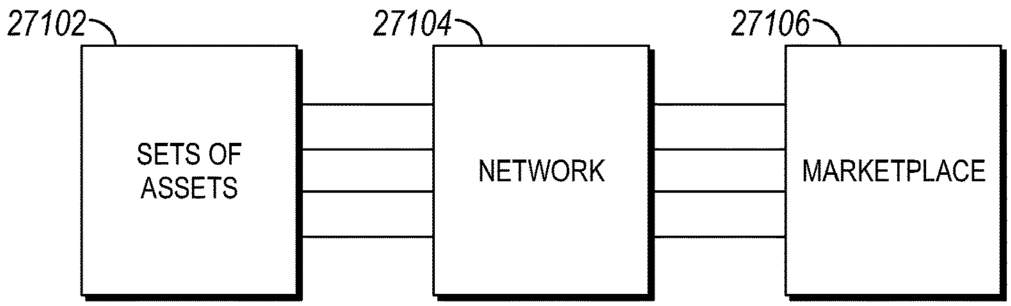

Referring to FIG. 271, a data and network infrastructure pipeline 27104 is configured to deliver data from a set of assets 27102 to one or more marketplace entities for one or more marketplaces 27106 in which transactions for portions of the sets of assets 27102 are conducted. In example embodiments, the data from the set of assets 27102 is delivered by the pipeline 27104 to an interface by which an operator orchestrates a set of parameters for a set of transaction workflows involving the assets. The pipeline 27104 may be automatically configured to adjust a network path for delivery of data from the set of assets 27102 to the interface based on the characteristics of the data and at least one performance parameter of the network path. In example embodiments, the pipeline 27104 may be automatically configured to adjust timing of asset data delivery from the set of assets 27102 to the interface based on at least one of a transaction parameter and a network performance parameter.

Referring to FIG. 271, a data and network infrastructure pipeline 27104 is configured to deliver data from a set of assets 27102 for use in transactions in one or more marketplaces 27106 in which transactions for portions of the sets of assets 27102 are conducted. In example embodiments, the data from the set of assets 27102 is delivered by the pipeline 27104 to a set of smart contracts that include terms, conditions and parameters for a set of transaction workflows involving the assets, such as transaction workflows of transactions of the assets 27102 in the marketplace 27106. The pipeline 27104 may be automatically configured to adjust a network path for delivery of data from the set of assets 27102 to the set of smart contracts based on the characteristics of the data and at least one performance parameter of the network path. In example embodiments, the pipeline 27104 may be automatically configured to adjust timing of asset data delivery from the set of assets 27102 to the set of smart contracts based on at least one of a transaction parameter and a network performance parameter.

Figure 272:
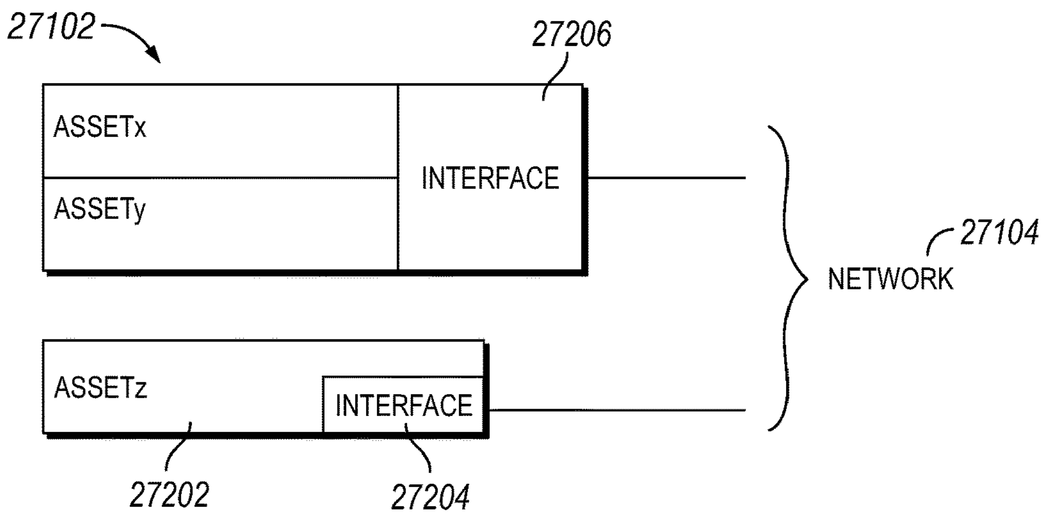

Referring to FIG. 272, the set of assets 27102 may include electronic device assets 27202 with electronic (e.g., wired/wireless) interfaces 27204 configured to deliver the data from and/or about the asset 27202 to an interface of the network pipeline 27104. The network pipeline 27104 may communicate with the interfaces 27204 through computer-to-computer networks, such as the internet and the like, using a range of protocols including TCPIP, and the like. One or more of the electronic assets in the set of electronic assets 27202 may communicate directly (e.g., through an interface) to the network pipeline 27104 through its corresponding interface 27204. Alternatively, a portion of the set of electronic device assets 27202 may be separated from the pipeline 27104 through an interface 27206, such as a local network router, gateway and the like. In example embodiments, the interface 27206 through which the portion of the set of electronic device assets 27202 may be a native interface of one of the electronic device assets 27202.

Figure 273:
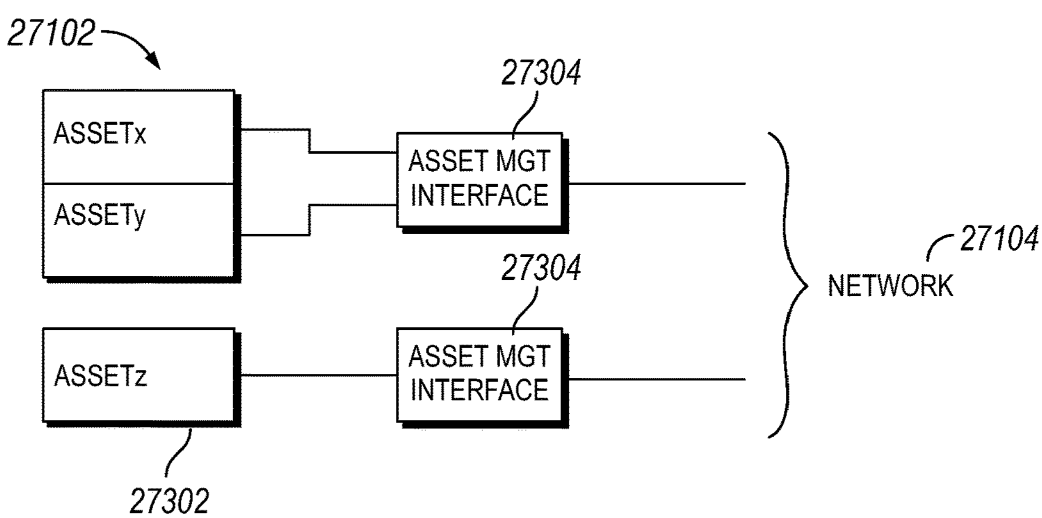

Referring to FIG. 273, the set of assets 27102 may include one or more assets 27302 that are managed by an asset management interface 27304 that is configured to deliver data pertinent to the asset 27302 for managing transactions of the one or more assets 27302 to the network pipeline 27104. The asset management interface 27304 may handle communication responsibilities associated with pertinent data for assets, such as one or more assets 27302 that do not have a communication capability, such as non-electronic physical assets. As an example, a set of assets 27102 may include one or more assets 27302 that does not have an interface through which the asset 27302 could communicate with the network pipeline 27104. In this example, the asset 27302 may be a battery, a piece of equipment, a structural member (e.g., a bridge truss), materials, and the like. The asset management interface 27304 may capture, such as through one or more sensors, cameras, human operators, and the like information about the asset, such as the asset external color, present location, asset weight, and the like. The asset management interface 27304 may capture information about the asset from a third-party information source, such as a warranty manual for the asset 27302, a last user of the asset 27302, and the like. The asset management interface 27304 may provide a capability for enabling use of the network pipeline 27104 to facilitate configuring, for example, parameters associated with transaction workflows for the asset 27302. The asset management interface 27304 may be configured to provide asset-relevant data for a single asset, a group of assets, and the like.

The network pipeline 27104 may communicate with the interfaces 27304 through computer-to-computer networks, such as the internet and the like, using a range of protocols including TCPIP, and the like. One or more of the assets in the set of non-electronic device assets 27302 may be depicted by its corresponding interface 27304 when communicating directly to the network pipeline 27104. Alternatively, a portion of the set of non-electronic device assets 27302 may be grouped and represented to the network pipeline 27104 through the interface 27304.

Figure 274:
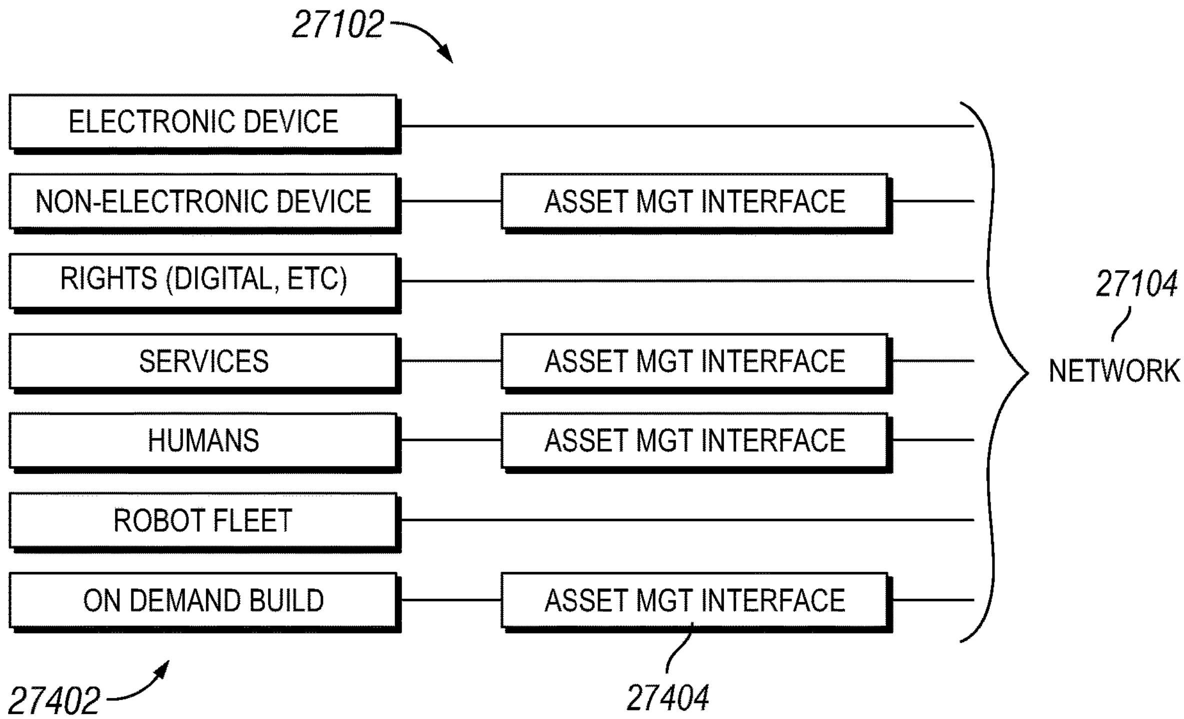

Referring to FIG. 274, the set of assets 27102 may include a plurality of types of assets 27402 including, without limitation, electronic device assets, non-electronic device assets, rights (e.g., digital), services, humans as assets, robotic fleet(s), and the like. The type of asset may be configured to provide information about aspects thereof, such as performance-related data, physical data, operational data, value data, data that defines parameters of use, jurisdictional data, and the like. As for asset types 27402 without a means of communicating with the network pipeline 27104, a suitable interface/controller 27404 may be configured to interface with the network pipeline 27104, similarly, at least in part, to that described herein for the asset management interface 27304 of FIG. 273. An electronic device type may provide information specific to its function, such as a sensor device that senses wind speed may provide wind speed data along with information that facilitates determining context of the data (e.g., how is it captured, capture timing, unit of measure, security data, and the like). A non-electronic device asset type may, such as through a suitable network pipeline interface 27404, expose information pertinent to transacting for the non-electronic device asset, such as physical, operational and other information that may enable an operator and/or a smart contract to configure one or parameters for conducting transactions of/for the asset. In example embodiments, asset data for service type assets may include information about the service as well as an indication of how to use the service, such as through a third party, through a network download of service software, through use of a network portal for receiving the services, and the like. Service-type assets, such as digital services, may be interfaced with the network pipeline 27104 through a computing device (e.g., a web server and the like) that provides the service. For physical-type service assets, such as in-field maintenance services, meal preparation services, energy supply services, and the like a suitable asset management interface module 27404 may facilitate providing information specific to types of physical service that can be leveraged by an operator and/or by a smart contract for orchestrating one or more transactions (e.g., including a transaction workflow) for the physical service assets. One such example includes a list of resources for providing the service(s) called out in the service-type asset.

An asset management interface, such as interface 27404, or interface 27304 may be embodied to provide, for example, asset-specific capabilities. An asset management system may also be configured to enable use of artificial intelligence and the like when generating and/or handling data about the asset. In example embodiments, an asset management interface may include a digital twin of the asset that may interface with the asset through one or more proprietary interfaces (or may independently monitor the asset) and provide near-real time data to the network pipeline 27104 that is consistent with the asset operational status, functionality, and the like. In example embodiments, an asset management interface, such as interface 27304 and/or 27404 may include a smart contract by which the asset is controlled or otherwise transacted. As an example, an asset may be a consumable supply item and a corresponding interface with the network pipeline 27104 may include a logistics service that provides inventory management, warehousing, distribution, and last-line delivery of the asset. Another asset type may include an on-demand built asset that may be represented to the network pipeline 27104 by one or more systems that produce and/or provide the on-demand built asset, such as a mobile 3D printing system that, based on a result of a transaction for an asset available to be built may build the asset while in transit to a recipient's identified destination. Yet another type of asset may include human assets. In example embodiments, human assets may be represented in the network pipeline 27104 through data provided from an asset management interface. An exemplary human asset management interface may include a business enterprise that employs the humans, such as a consulting agency that provides human resources for deployment to business tasks and the like. Another exemplary human asset management interface may include a set of sensors deployed to capture and provide pertinent information for use in marketplaces in which the human resources are transacted. As an example, a human may wear a smart watch that monitors a range of aspects, including some health aspects of the human. Data from the smart watch may be made available to the network pipeline 27104 when transactions regarding the human are being orchestrated, such as for identifying candidates for a sleep study for which a transaction is being conducted. Other monitoring devices, such as an electronic calendar system for the human may share data representative of an expected availability of the human for a future time frame for which humans (e.g., crowd sourcing) are being solicited in a transaction to perform a task.

Information provided to the network pipeline 27104 from or on behalf of an asset may cover a range of aspects of the asset. A few exemplary aspects are described here as examples of this range; however, these examples, or other description of such data is not to be dispositive of the full range and scope of data of or about an asset that is contemplated for use in the methods and systems of data network and infrastructure pipelining for marketplace orchestration and the like described herein. In example embodiments, aspects related to an expiration of the asset (e.g., use by date) or of an offer associated with the asset (time-limited pricing), and the like may be provided. Owners of perishable assets may derive a benefit from network pipeline delivery of this information being prioritized by the network data pipeline 27104 for urgent delivery, such as by organizing the network (e.g., configuring a route of the network) to prioritize delivery of information while the perishable asset remains usefulness to a perspective recipient in a transaction for the asset. In an example, an owner of a financial instrument that has an expiration date, such as an option in a stock market, may benefit from prioritization of delivery of information about the asset (e.g., its terms, pricing, expiration, and the like) based on context of market activity about the underlying financial instrument covered by the option. Owners of ripening assets may derive a benefit from network pipeline timing being adjusted based on a timing of the ripening asset becoming available.

Timing of asset data through a network pipeline 27104 may also be influenced by information about the asset, such as when the asset will be ready for delivery (or when the asset is expected to be delivered based on an estimate of delivery delays). Cross market transactions may benefit from a data network pipeline that adjusts timing of data delivery for a first asset based on information regarding a second asset. As an example, the timing of providing information from a service provider-type asset to a smart contract for providing services to owners of a serviceable asset may be adjusted based on information provided from the serviceable asset through the network pipeline 27104. The network pipeline 27104 may be configured to adjust delivery timing of data signaling an activation of a service contract based on information from the serviceable asset being provided to the network and transaction confirmation information derived from a workflow associated with a transaction for the serviceable asset.

In example embodiments, information relating to asset performance or reliability is another example aspect of asset data that may be provided from or on behalf of an asset through the network pipeline 27104. In an example related to asset reliability, information regarding a measure of reliability of providing energy from a wall battery in a private home that is charged by solar power may impact a value of the energy. In times of demand for energy, the private wall battery data, such as a historical record of timely release of energy may be valuable to orchestrating transactions in an energy marketplace where buyers seeking to purchase stored energy value such information. However, if a network pipeline 27104 fails to provide information about this potentially valuable source of energy in a timely manner, transaction for the energy may have been satisfied before the information can be used for orchestrating a transaction and the like. Therefore, a network pipeline 27104 may be configured to adjust a network path and/or prioritization of delivery of data through a configured network path based on a combination of a demand for a commodity (e.g., stored energy) and an aspect of performance of energy providing assets (e.g., an energy storage facility).

In example embodiments, information relating to asset capacity, or remaining inventory, may be provided from or on behalf of an asset through the network pipeline 27104. Use of a rechargeable service vehicle may be an asset for which a marketplace exists. In addition to basic information about the service vehicle (carrying capacity, etc.) and remaining charge of the service vehicle battery, the network pipeline 27104 may receive information about deployment of the asset that may impact, for example, pricing of the asset. In this example, use of the vehicle proximal to a charging station may be priced lower than use that results in the vehicle being located far from a charging station. Therefore, information about deployment of the asset, that may be sourced from other than the asset may be pertinent to transaction workflows in a marketplace for the asset. Similarly, information about an asset having an upcoming service event may be valuable to be provided through the network pipeline 27104. In this service event example, a path of asset data may be adjusted based on the upcoming service need, such as by directing information through the network to potential providers of the service. In this way, the network pipeline 27104 may configure a path for information about the asset that gathers information about an asset from a related third-party asset provider (e.g., a service provider asset) to improve orchestration of one or more transactions (e.g., configuring parameters and the like for transaction workflows) for the asset.

Another type of asset data that may be delivered by and influence adaptation of paths and/or timing of network infrastructure of network pipeline 27104 includes rapidly changing information, such as stock pricing, and other real-time impacted data. Such data may be provided from an asset as a data stream that includes changes in the asset data, such as bid, ask, and spread information for an electronically traded financial instrument, and the like.

Figure 275:
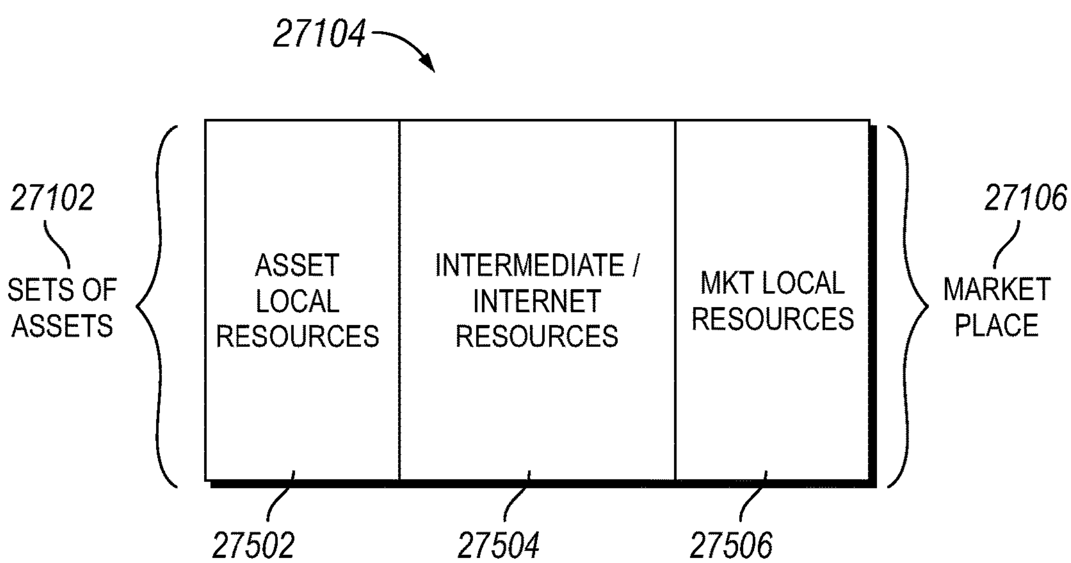

Referring to FIG. 275, the data and network infrastructure pipeline 27104 may include a set of asset-centric intelligent network resources 27502 that may be disposed proximal to the set of assets 27102. The data and network infrastructure pipeline 27104 may further include a set of intermediate intelligent network resources 27504 that may be configured to deliver data from the set of assets 27102 through the network pipeline as described herein. The data and network infrastructure pipeline 27104 may also include a set of marketplace-centric intelligent network resources 27506 that may be disposed proximal to recipients of the asset data, such as interfaces associated with a marketplace 27106 in which one or more transactions (and associated transaction workflows) for the assets 27102 may be conducted. The one or more sets of intelligent network resources, such as sets of asset-centric resources 27502, intermediate resources 27504, or sets of marketplace-centric resources 27506 may be implemented in or in association with physical resources of a data communication network, such as the Internet and the like. Sets of asset-centric resources 27502 and/or sets of marketplaces (e.g., asset data recipient) centric resources 27506 may include network infrastructure resources, such as edge computing devices, inter-network interface devices (e.g., bridges, routers, and the like), aggregation devices, such as a distributed antenna system, and the like.

Figure 276:
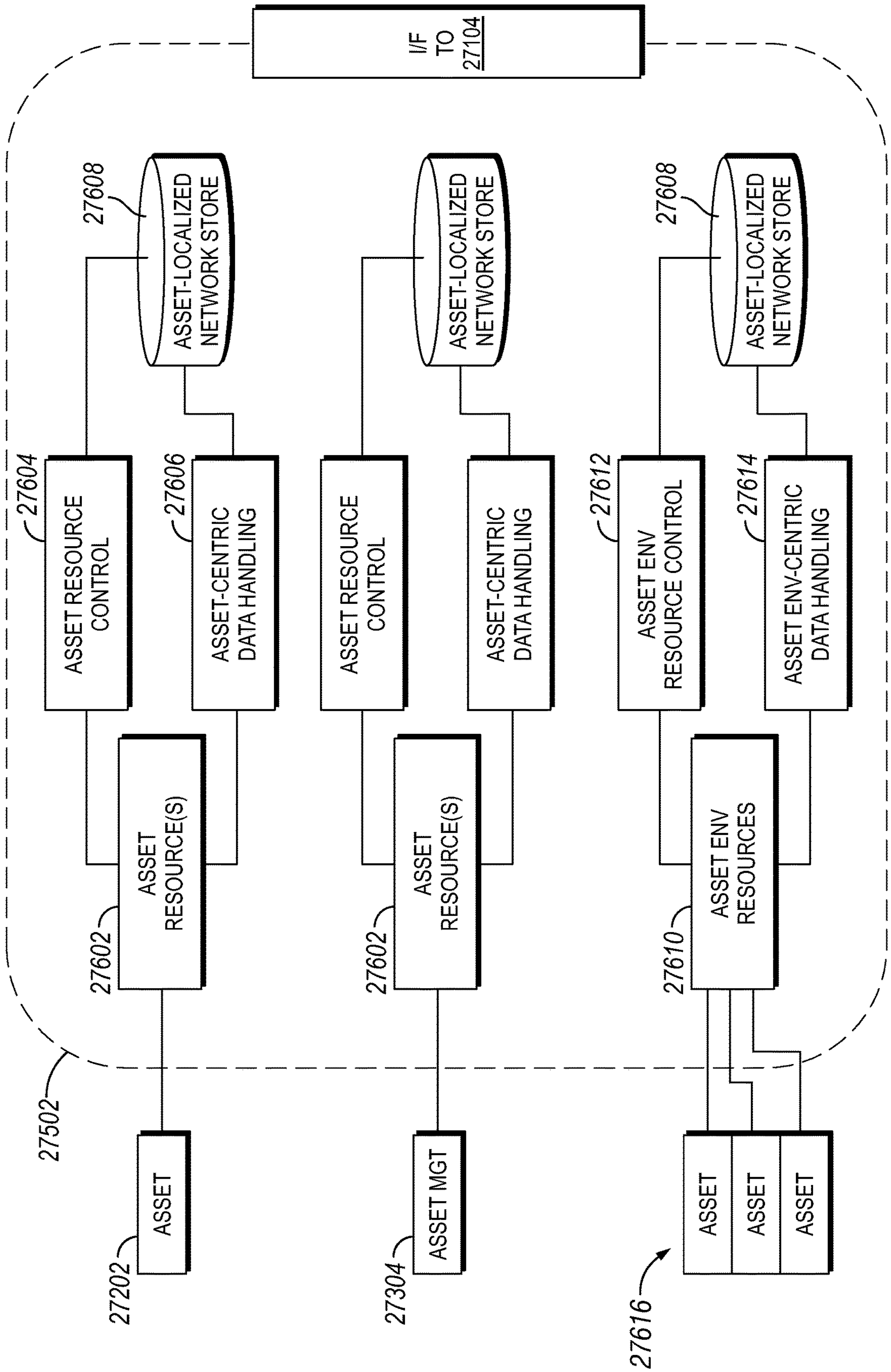

Referring to FIG. 276, the data and network infrastructure pipeline 27104 may include a set of asset-centric intelligent network resources 27502 that may be configured to deliver data from one or more sets of assets 27102 through the network pipeline 27104. These sets of asset-centric intelligent network resources 27502 may include a set of asset local resources 27602 that are configured by an asset local resource controller 27604 to work cooperatively with asset-centric data handling service 27606 to among other things manage use of asset-localized network storage 27608 to preserve the data delivered from the sets of assets 27102 for supporting network path and network delivery timing adaptations described herein. In example embodiments, the asset local resources 27602 may be configured to interface with intelligent assets, such as electronic assets 27202. The asset local resource controller 27604 may automatically determine, such as through a result of analysis of data from the electronic assets 27202 by the asset-centric data handling system 27606, configuration parameters for one or more of the sets of asset local resources 27602 to interface with one or more corresponding electronic assets of the set of electronic assets 27202. The asset local controller 27604 may retrieve such result of analysis from the asset-localized network store 27608.

Computing logic associated with an exemplary asset local resource 27602, such as a processing system or circuit thereof and the like, may be configured to execute communication protocols suitable for interacting with the interface 27204 of an electronic asset 27202, such as a specific asset data transfer protocol, and the like. As an example, a communication (sub) system of an exemplary local asset resource 27602 may be configured to communicate with an electronic device asset 27202 (e.g., through a corresponding asset interface 27204 and the like) to facilitate delivery of asset data over the network pipeline 27104, including without limitation the asset responding to queries for asset data from the network pipeline 27104. The asset local intelligent resource 27602, optionally in cooperation with the asset local resource controller 27604 and/or the asset-centric data handling system 27606 may facilitate processing of asset data and communication with an asset so that the network pipeline 27104 may be configured to deliver data from electronic asset 27202 independently of how a communication system of the asset might be programmed.

In other example embodiments, the set of asset local resources 27602 that are configured by an asset local resource controller 27604 to work cooperatively with asset-centric data handling service 27606 to among other things manage use of asset-localized network storage 27608 to preserve the data delivered from non-intelligent assets, such as through an asset management interface system 27304, including to preserve the data delivered from the assets for supporting network path and network delivery timing adaptations described herein. The asset local resource controller 27604 may automatically determine, such as through a result of analysis of data from the asset management interface system 27304 by the asset-centric data handling system 27606, configuration parameters for one or more of the sets of asset local resources 27602 to interface with one or more corresponding asset management interface systems 27304 of the set of non-electronic assets 27102. The asset local controller 27604 may retrieve such result of analysis from the asset-localized network store 27608.

Computing logic associated with an exemplary asset local resource 27602, such as a processing system or circuit thereof and the like, may be configured to execute communication protocols suitable for interacting with the asset management interface system 27304 of an asset of the set of assets 27102, such as a specific asset data transfer protocol, and the like. As an example, a communication (sub) system of an exemplary local asset resource 27602 may be configured to communicate with an asset management interface system 27304 to facilitate delivery of asset data over the network pipeline 27104, including without limitation the asset responding to queries for asset data from the network pipeline 27104. The asset local intelligent resource 27602, optionally in cooperation with the asset local resource controller 27604 and/or the asset-centric data handling system 27606 may facilitate processing of asset data and communication with an asset so that the network pipeline 27104 may be configured to deliver data from the asset management interface system 27304 independently of how a communication system thereof might be programmed.

In example embodiments, the sets of asset-centric intelligent network resources 27602 may be configured to deliver data from an asset collection (e.g., a local collection of assets within a facility, such as a production, warehousing, or other environment) through a set of asset environment local resources. These resources may be disposed logically and or physically within or proximal to a deployment environment for asset collection and may be configured by an asset environment local resource controller to work cooperatively with an asset-collection centric data handling service to among other things manage use of asset-localized network storage 27608 to preserve the data delivered from the assets for supporting network path and network delivery timing adaptations described herein. In example embodiments, an exemplary asset environment local intelligent resource of the set of resources may be configured to identify and communicate with at least a subset of individual assets within the collection. The asset environment centric data handling system may normalize data that is differentiated among the collection of assets to conform to a set of asset data requirements for format and the like. The asset environment centric data handling system may further and/or alternatively process data from the collection, selecting at least in part asset data to be delivered over the network pipeline 27104 (and/or optionally stored in asset-localized network store 27608) to facilitate adaptation of path and/or timing aspects of the network pipeline 27104 as described herein.

In general, configuration of and processing by asset local intelligent network resources 27602 and/or asset environment local intelligent network resources may be guided by knowledge of source assets to facilitate adapting aspects of the network pipeline 27104 according to the methods and systems described herein.

Figure 277:
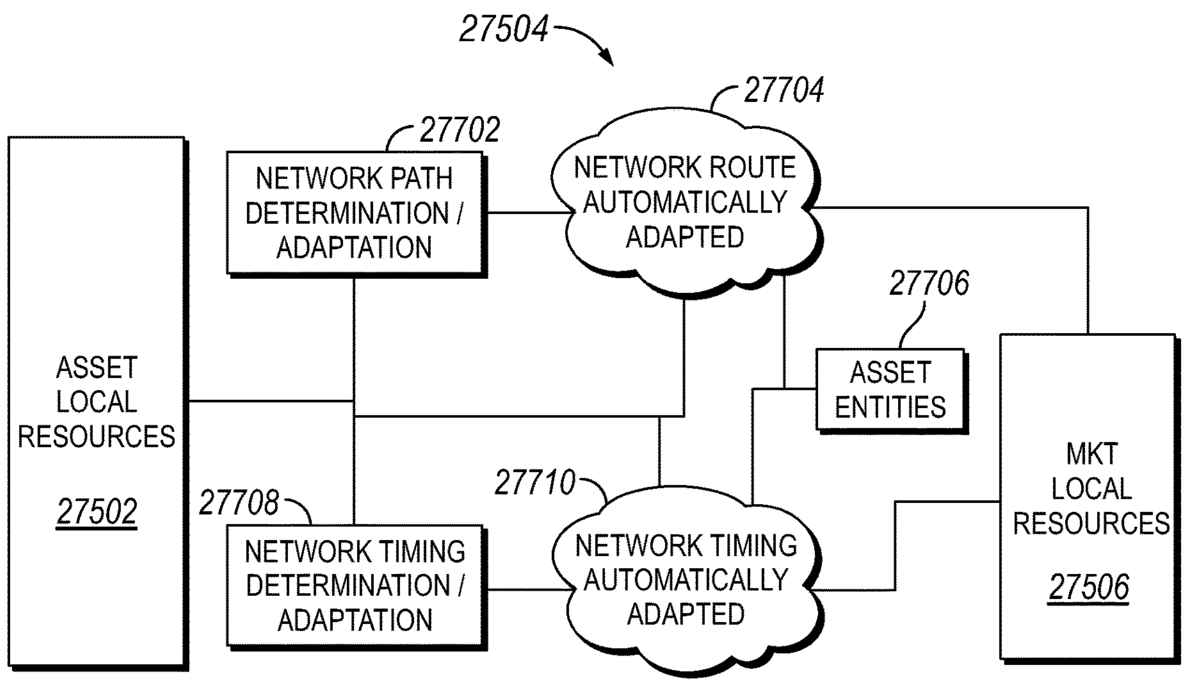

Referring to FIG. 277, the data and network infrastructure pipeline 27104 having a set of intermediate intelligent network resources 27504 may be adapted to deliver asset data from the asset local resources 27502 on to one or more marketplace related interfaces, such as a user interface, a smart contract, and the like. The set of intermediate intelligent network resources 27504 of FIG. 277 may include a network path adaptation/determination system 27702 that facilitates adapting a network path by producing an automatically adapted network route 27704 for the asset data. The network path adaptation/determination system 27702 may perform network path determination based on characteristics of the asset data. Aspects of the data that may impact network path adaptation/determination may include security requirements. In example embodiments, when an aspect of an asset (optionally expressed in or inferred from the data) indicates a high security requirement for transfer of the data through the network pipeline 27104, a network path may be adapted and/or determined by the path determination/adaptation system 27702 based on resource reputation. In an example, network resources identified as other than having a high security integrity score (e.g., resources that may be suspect for lacking security integrity and/or may not be cleared of potential malware) may be avoided when configuring a route through the network for the asset data. In example embodiments, resources that are not classified as either secure or suspect may be avoided.

In another example of network adaptation for data security considerations, the network adaptation system 27702 may adjust a transmission protocol to avoid exposing data from the asset in a context that gives meaning to the data. In example embodiments, adjusting a transmission protocol may include encrypting the data. In other examples adjusting a transmission protocol may include processing asset data, such as with the asset-centric data handling system 27606 and the like to separate data from relevant context, such as by sending a first transmission of a first portion of the data and sending a second transmission of a second portion of the data. Further, the network adaptation system 27702 may choose distinct routes for the two portions of data, thereby further reducing the potential for a resource in the adapted network path substantively compromising security of the data.

In another example of network path adaptation, a network path may be adapted dynamically. The network adaptation system 27702 may maintain a record of network paths configured for delivery of data from an asset and may adapt a route for the data so that it changes over time and in apparently arbitrary ways to further increase the secure handling of the data within the network pipeline 27104.

In yet another example of network path adaptation based on aspects of data from an asset, a network path may be determined based on one or more of a location of a source of asset data (e.g., a jurisdiction of a current location of the asset) and a location of a destination of the asset data (e.g., a jurisdiction of a marketplace, an operator interface, a smart contract, a participant/buyer of the asset, a deployment location of the asset, and the like). The network pipeline 27104 may include intermediate resources in a range of jurisdictions. Avoiding jurisdictions when adapting a network path for delivery of asset data through the network pipeline 27104 may be impacted by requirements and/or preferences of an asset owner, a recipient of asset data, an operator of the network pipeline 27104, a government agency, and the like. In example embodiments, although reference is made to jurisdictions, other ways of identifying one or more network resources to avoid are contemplated herein, such as based on IP address, costs associated with use of the network resources, performance (e.g., historical) of network resources, crowd-based recommendations for resources to avoid, use of artificial intelligence for path generation, and the like. In example embodiments, network path determination/adaptation may include, for example, configuring a Virtual Private Network (VPN) for delivery of asset data.

The network path adaptation/determination system 27702 may perform network path determination based at least one performance parameter of the network path. The network path adaptation/determination system 27702 may perform network path determination based on at least one of a transaction parameter and a network performance parameter. The network path adaptation/determination system 27702 may perform network path determination based on an aspect of a recipient of the asset data. A network path may be adapted in a first manner for a user interface recipient of the asset data, a second manner for a smart contract recipient of the asset data, a third manner for other recipients of the asset data.

The automatically adapted network route 27704 may facilitate delivery of asset data to, for example, the marketplace local resources 27506. The automatically adapted network route 27704 may be configured to deliver at least a portion of the asset data to one or more asset entities 27706 for handling one or more aspects of transactions of the assets, such as preparation of the assets, preparation of transaction-relevant information about/derived from the asset data and the like. Generally, configuring a network pipeline path may include routing asset data to specific entities, such as carriers, insurance providers, asset appraisers, regulatory agencies and the like. Determination of a path that may include delivery of at least a portion of asset data to an asset entity 27706 may be based on aspects of the set of assets 27102, such as based on analysis of asset data. In an example, an asset owner may indicate, such as through asset data delivered over the data network pipeline 27104, that transactions for the asset are to be performed through a specific transaction settlement vendor, such as a bank or other third party. In example embodiments, the network path adaptation system 27702 may, based on such an indication, route at least a portion of the asset data to a transaction settlement vendor that may be selected from the set of asset entities 27706 and the like. The network path determination system 27702 may further determine, based on insights gleaned from the asset data being provided to the network pipeline 27104 that an appraisal of the corresponding asset is outdated or otherwise may present a mitigating factor during a transaction for the asset. Based on this assessment, the network path determination system 27702 may configure a path that includes providing at least a portion of the asset data to an appraisal resource, optionally selected from the set of entity assets 27706. In example embodiments, the network path determination system 27702 may prescribe a network path that routes the portion of the asset data to the appraisal resource and works cooperatively with a network timing adjustment system 27708 to adjust timing of delivery of a portion of the asset data to one or more of the market-centric resources 27506. The timing may be adjusted so that delivery of the asset data to, for example, an interface of a marketplace through which an operator configures parameters for transaction workflows of the asset, is coordinated with delivery of asset appraisal results from the asset appraisal resource. The automatically adapted network route 27704 may further be configured to route data produced by or on behalf of the asset entities 27706 to the marketplace local resources 27506.

In example embodiments, adapting a network path may further be based on aspects of workflow steps for transactions of or associated with the assets. In an example of workflow impact on adapting a network pipeline path, a workflow may include an (optional) appraisal step that, unless activated in the workflow, would not be present in the transaction. Therefore, configuring a network path to include routing a portion of the asset data to the appraiser may be dependent on activation of an appraisal workflow task as, for example, a requirement of a transaction for the asset.

The set of intermediate intelligent network resources 27504 of FIG. 277 may include a network timing determination or adaptation system 27708 to facilitate, among other things, asset data or asset-related data delivery according to one or more time-related aspects of a transaction of the assets 27102. The network timing determination or adaptation system 27708 may configure a portion of an interconnected network, optionally including one or more network-accessible computing and/or storage resource into a network path with automatically adapted timing 27710.

The network path configured with automatically adapted timing 27710 may deliver asset data and/or asset-relevant data (e.g., as may be produced by the asset entities 27706) to one or more marketplace local resources in the set of intelligent market local resources 27506. The network timing determination and adaptation system 27708 may perform network path timing adaptation in cooperation with one or more of the sets of asset-centric intelligent network resources 27502. In an example, the network timing determination and adaptation system 27708 may determine that asset data is to be scheduled for delivery no sooner than an earliest delivery date (e.g., after an announcement by the asset owner related to the asset). The network timing determination and adaptation system 27708 may communicate with, for example, the asset local resource controller 27604 and/or the asset-centric data handling system 27606 to process and/or store asset data in the asset-localized network store 27608. The network timing determination and adaptation system 27708 may, based on a signal that the earliest delivery data has occurred, retrieve or request to be retrieve the stored asset data for delivery through a network path configured for delivery. In example embodiments, configuring a network to comply with timing requirements associated with delivery of asset data may include configuring intermediate network storage (e.g., other than an asset-localized network storage facility 27608) to store relevant asset data.

In yet another example of automatically adapting an aspect of network timing for at least a portion of a network pipeline 27104 for providing data from a set of assets 27102 for use in configuring transaction workflows for the assets, a priority of network packets comprising the network data may be configured so that the asset data achieves a network delivery timing requirement. This may include configuring a network path based on known or anticipated performance of resources along the pipeline so that, for asset data that is to be delivered quickly, resources with lower performance scores may be avoided. Similarly, when timing for delivery of asset data can be extended, a network path may be selected to reduce costs of delivery of the data by choosing, for example lower cost resources that may induce delays in data delivery.

In example embodiments, configuring a network, such as timing-adapted network 27710 may include parking data for assets until a future time indicated by, for example a workflow for transacting the assets. As an example, a transaction workflow for a digital asset (e.g., access to a database and the like) may indicate that delivery timing of asset data, such as an access code and the like, is dependent on a transaction for the asset achieving a stage of transaction progression, such as a stage that results from a confirmation of payment being received for the asset. The network pipeline 27104 may be configured into a network timing adapted network configuration 27710 that parks the asset data conditionally based on the asset transaction workflow timing.

In example embodiments of FIG. 277, a network adaptation system may automatically construct a network infrastructure path in a network pipeline to deliver data from an asset to a market orchestration recipient, the constructed network infrastructure path may be automatically adapted based on one or more characteristics of the data from the asset and at least one performance parameter for the network infrastructure path. Further, a network timing adaptation system may automatically adapt network infrastructure resources in a network pipeline that delivers data from the asset to the market orchestration recipient for orchestration of a transaction of the asset. The network infrastructure resources may be adapted based on at least one of a parameter of the transaction of the asset and a performance parameter of the network pipeline. In the example embodiments of FIG. 277, a set of asset-centric network resources may facilitate ingestion of the data from the asset into the network pipeline. Also, a set of marketplace-centric network resources may facilitate delivery of the asset data from the adapted network pipeline to the market orchestration recipient. In example embodiments, the network pipeline may deliver the data from the asset to the market orchestration recipient for orchestration of a transaction of the asset. In an example of timing adaptation, the network timing adaptation system may adapt the network infrastructure resources in the network pipeline to satisfy a data delivery timing requirement associated with a transaction workflow for the asset. In another example of timing adaptation, the market orchestration recipient may include a smart contract that includes terms, conditions, and parameters for a set of transaction workflows involving the asset. Also in an example, adapting the network infrastructure path may be based on one or more security characteristics of the asset data, such as configuring a path through the network pipeline that avoids poor reputation network resources. In example embodiments, constructing a network infrastructure path in a network pipeline may include adjusting a communication protocol that avoids exposing data from the asset in a context that gives meaning to the data. This may include delivering a first portion of the asset data through a first network path and a second portion of the asset data through a second network path. Another example of secure-context protecting network path adaption may include adapting the network path for delivering the data from the asset so that the network path changes over time. Also, by ensuring that at least one infrastructure node in the constructed network path is different than infrastructure nodes used previously to deliver the data from the asset. In an example, adapting the network infrastructure path based on one or more characteristics of the data from the asset may include configuring a plurality of recipients for one or more portions of the data from the asset, wherein the plurality of recipients is determined from a transaction workflow for the asset.

Figure 278:
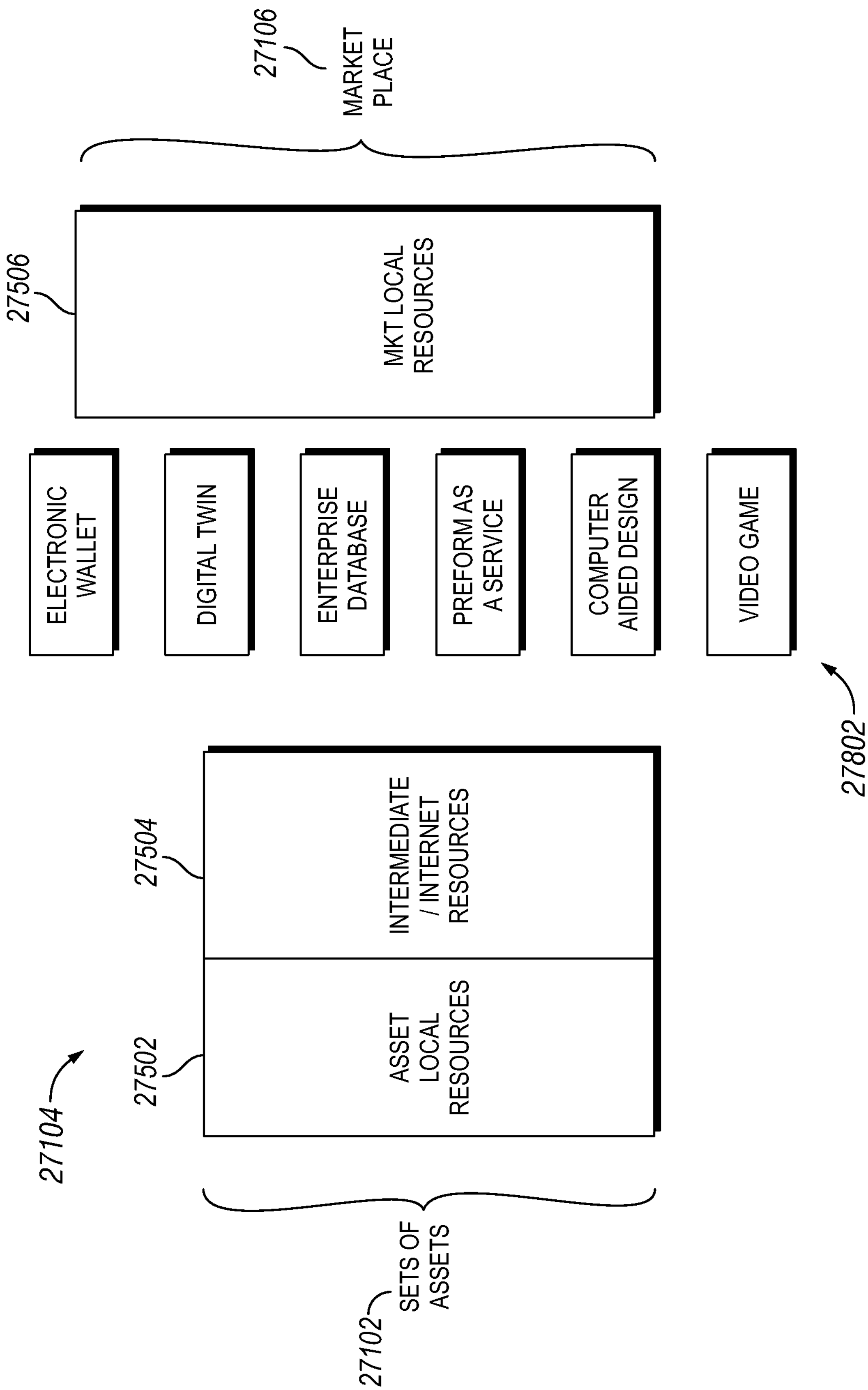

Referring to FIG. 278, the data and network infrastructure pipeline 27104 may have a set of marketplace entities 27802 that may be configured proximal to one or more intelligent resources in the set of intelligent marketplace local resources 27506. The marketplace entities 27802 may be configured as computing modules capable of being instantiated with or within one or more computing elements, such as the marketplace local resources 27506, a network-accessible computing device, a network routing element, a computing system embodying one or more aspects of the marketplace 27106, and the like. The marketplace entities 27802 may include entities that provide services associated with performing transaction workflows for one or more of the set of assets 27102. The entities may provide services including electronic wallet services, digital twin services, enterprise database services, platform as a service, computer aided design services, video game services, and the like. Example embodiments of the methods and systems for data network and infrastructure pipeline adaptation incorporating one or more of these services are depicted in figures and described in corresponding disclosure herein.

Figure 279:
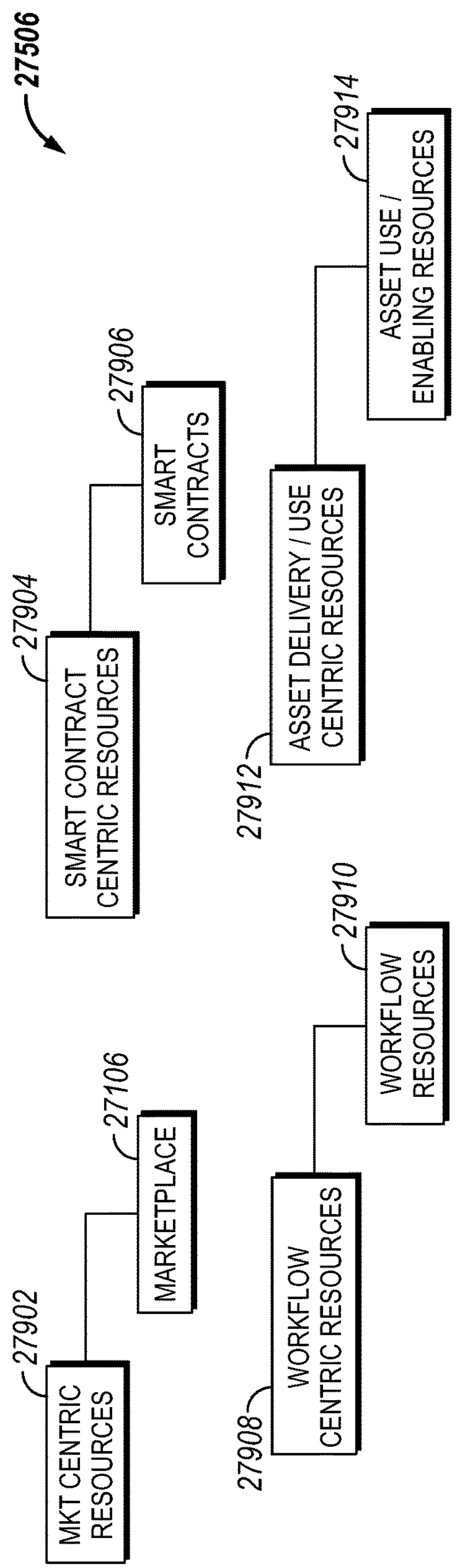

Referring to FIG. 279, the set of marketplace-centric intelligent network resources 27506 may facilitate connecting recipients of the asset data to the adapted networks, such as route-adapted network 27704, timing-adapted network 27710, and other networks adapted to satisfy one or more of the transaction configurations and/or orchestration aspects described herein. The marketplace-centric intelligent network resources 27506 may be disposed variously within a network, such as an enterprise network, the Internet and the like. In example embodiments, resources 27506 may be disposed proximal to one or more target recipients of asset data. Further, independent of a physical location of one or more of the marketplace-centric intelligent network resources 27506 (and/or associated control systems), resources may be configured with functionality that provides marketplace-centric services, optionally utilizing computing resources of a corresponding asset data recipient, such as a computing system executing a smart contract recipient and the like. Example locations for marketplace-centric intelligent network resources 27506 includes locations proximal to a marketplace interface, such as a user interface through which an operator may orchestrate a set of parameters for a set of transaction workflows involving the assets. Another example location for marketplace-centric intelligent network resources 27506 includes locations that are proximal to a processor executing smart contracts that include terms, conditions and parameters for a set of transaction workflows involving the assets. Yet another example location for marketplace-centric intelligent network resources 27506 includes being disposed proximal to transaction workflow resources. In example embodiments, another example location for configuring marketplace-centric intelligent network resources 27506 includes proximal to asset enabling/utilization resources, such as asset entities 27802 and the like.

In example embodiments, a recipient of asset data may include a marketplace configuration interface, a smart contract interface, and the like as is described elsewhere herein. The set of marketplace-centric intelligent network resources 27506 may include a marketplace-centric intelligent resource 27902 that facilitates timely and efficient access by a marketplace 27106 to asset data and/or asset-related data that may be provided through the intermediate intelligent network resources 27504. The marketplace-centric intelligent resource 27902 may coordinate access to asset data by an interface of a marketplace, such as an interface through which an operator may orchestrate a set of parameters for a set of transaction workflows involving the assets.

The set of marketplace-centric intelligent network resources 27506 may include a set of workflow centric resources 27908 that may facilitate timely and efficient access by a set of workflow resources 27910 to asset data and/or asset-related data that may be provided through the intermediate intelligent network resources 27504. The set of workflow resources 27910 may be configured with services that manage access by a workflow for a transaction of an asset to data for the asset. In an example, a transaction workflow resource 27910 may include a utilization charge associated with use of the asset associated with the transaction (e.g., miles driven for a rental car transaction). The set of workflow centric resources 27908 may determine that this information is useful to a corresponding step in the transaction workflow (e.g., payment to an asset owner for the utilization of the asset). In example embodiments, the set of workflow centric resources 27908 may determine that this information is useful by analysis of the workflow, such as through use of artificial intelligence service analysis. In example embodiments, the set of workflow centric resources 27908 may determine that this information is useful based on one or more workflow parameters, such as one or more workflow parameters in a set of parameters for the transaction workflow for the asset orchestrated by an operator (e.g., a utilization parameter). The set of workflow centric resources 27908 may coordinate with aspects of the network pipeline 27104 resources, such as a controller 27604 for an asset-localized network store 27608 in which utilization data for the asset is stored. The set of workflow centric resources 27908 may, based on the utilization parameter for a corresponding transaction workflow may initiate configuration of a utilization measure capture function to be performed by an asset local controller 27604 that is configured to work cooperatively with the asset, such as intelligent asset 27602. In example embodiments, the set of workflow-centric resources 27908 may further coordinate with a network timing determination/adaptation system 27708 to adjust a network configuration for delivery of the utilization data based on requirements in the workflow. In this example, a step in a transaction workflow may indicate that utilization data for the asset is to be provided periodically, such as at the end of a day to be processed by functions of the workflow step. The set of marketplace-centric intelligent resources 27908 may indicate to the network timing determination/adaptation system 27708 to configure a logical connection between the asset and the workflow daily at 12:02 AM to deliver utilization information for the previous day. In example embodiments, the network timing determination/adaptation system 27708 may configure a logical connection between an asset-centric intelligent resource 27502 through which the asset connects to the network pipeline 27104. For this approach, the asset-centric intelligent resource 27502 can provide the information in compliance with the workflow requirements (e.g., 12:02 AM) while interfacing to the asset utilizing asset-centric methods, such as capturing utilization data at a time determined in cooperation with the asset (e.g., at the end of a work shift that utilizes the asset), which may be different than the time specified by the workflow.

The set of marketplace-centric intelligent network resources 27506 may include a set of smart contract-centric resources 27904 that may facilitate timely and efficient access by a set of smart contracts 27906 to asset data and/or asset-related data that may be provided through the intermediate intelligent network resources 27504. In example embodiments, the smart contracts 27906 may include terms, conditions and parameters for a set of transaction workflows involving the assets. For an energy storage asset, such as an electricity storage module in a distributed energy storage system, the smart contract-centric resources 27904 may facilitate monitoring stored energy in a plurality of storage modules to satisfy a condition of a smart contract identified in a transaction workflow for use of energy from the distributed energy storage system modules.

The set of marketplace-centric intelligent network resources 27506 may include a set of asset delivery/use-centric resources 27912 that may facilitate timely and efficient access by a set of asset use/enabling resources 27914 to asset data and/or asset-related data that may be provided through the intermediate intelligent network resources 27504. In example embodiments, adapting a route and/or timing of delivery of data through the network pipeline 27104 may be based on an intended use and/or deployment of an asset by a corresponding asset use/enabling resource 27914. An asset use/enabling resource 27914 may be designated by a participant in a transaction for the asset. IN an example, a municipal agency may be negotiating for use of stored energy. The municipal agency may have a contractual agreement (e.g., via a union contract and the like) to engage a specific fee-setting third-party for use of stored energy supplies. Based on this arrangement, a network pipeline 27104 may include adjusting a path for asset data to include the specific fee-setting third-party as a recipient of the asset data. In another stored energy transaction scenario, asset use/enabling resources 27914 may include mobile equipment that is dispersed across a plurality of jurisdictions. The asset delivery/use centric resources 27912 may include one or more consolidation resources (e.g., a network infrastructure edge computing device) that coordinate energy demand from groups of the dispersed resources 27914. In example embodiments, such a consolidation resource may be configured for different jurisdictions to facilitate compliance with resource 27914 requirements, and also with jurisdiction-specific requirements.

In example embodiments, the set of marketplace-centric intelligent network resources 27506 may facilitate adaptation of a path and/or timing in a network pipeline 27104 based on requirements of transaction workflows. A resource providing such a service to the workflow may be disconnected from (e.g., indirectly associated with) the asset. Further the resource providing the service may be determined by and/or impact aspects of the transaction workflow. In an example, a service provided by resource X causes an impact Y on a workflow for transactions of the asset. As a result, the network pipeline 27104 may response to this impact by adjusting a network path for data from the asset to include resource X.

Figure 280:
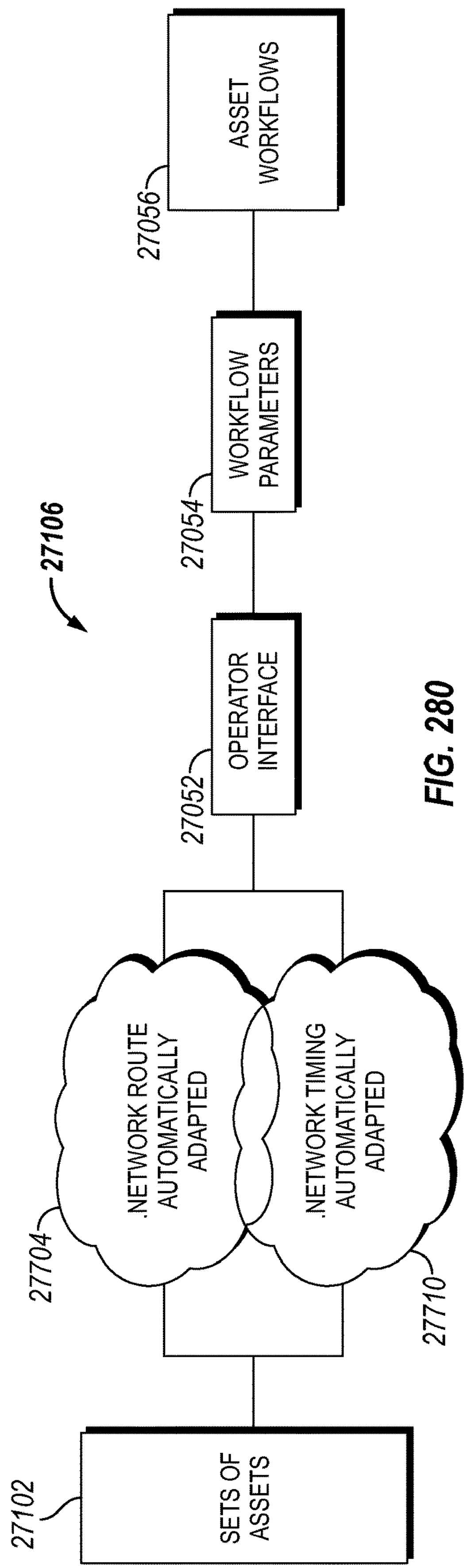

Referring to FIG. 280, a data and network infrastructure pipeline 27104 is configured to deliver data from a set of assets 27102 to an interface 27052 by which an operator orchestrates a set of parameters 27054 for a set of transaction workflows 27056 involving the assets. The data and network infrastructure pipeline 27104 may include a route-determined path 27704 that is automatically adapted based on one or more characteristics of the asset data and at least one performance parameter of a (model/initial/default/random/third-party prescribed) network path. Techniques for adapting the route-determined path 27704 are depicted in the figures of this disclosure and described elsewhere herein, including without limitation FIG. 277 and its accompanying descriptions. The data and network infrastructure pipeline 27104 may include a time-determined path 27710 that is automatically adapted based on one or more characteristics of the asset data and at least one performance parameter of an (initial/model/default/random/third-party prescribed) network path. Techniques for adapting the time-determined path 27710 are depicted in the figures of this disclosure and described elsewhere herein, including without limitation FIG. 277 and its accompanying descriptions.

Adapting one or more of a network path or timing of delivery of data through the network pipeline 27104 may include use of an application programming interface associated with the operator interface 27052.

In example embodiments, the method and systems for adapting routing and/or timing for delivering data through a network pipeline 27104 may include use of a digital twin platform. A digital twin platform may include digital twins of assets, marketplaces, workflows, and the like. Adapting a network path through the network pipeline 27104 may include adapting a network path to provide data to a digital twin of the asset. Adapting timing of data delivery through the network pipeline 27104 may include adapting timing of delivery of asset and/or asset-related data to the digital twin of the asset.

In example embodiments, the method and systems for adapting routing and/or timing for delivering data through a network pipeline 27104 may include use of robotic process automation of, for example adapting a network route and/or adapting timing. Use of robotic process automation may also include developing automation of operator actions within the operator interface 27052, such as actions that configure workflow parameters 27054.

Adapting a network path through the network pipeline 27104 may include adapting a network path to provide data to a digital twin of the asset. Adapting timing of data delivery through the network pipeline 27104 may include adapting timing of delivery of asset and/or asset-related data to the digital twin of the asset.

In example embodiments, an operator may orchestrate workflow parameters through the operator interface 27052. Factors that may impact workflow parameters 27054 may include an understanding of a relationship among, for example, an owner of the asset and a recipient of a transaction for the asset. For close relationships, transaction workflow parameters 27054 may be orchestrated by the operator to enable direct transfer of the asset and/or asset data. A corresponding adaptation a route for asset data in the network pipeline 27104 may include a route from the asset to the recipient. For indirect relationships, transaction workflow parameters 27054 may be orchestrated to include use of an escrow intermediary. A corresponding adaptation a route for asset data in the network pipeline 27104 may include a route from the asset to an escrow agent and then, conditionally to the recipient.

Asset data received at the operator interface 27052 may include transaction financial terms. The operator may, based on this data, configure workflow parameters to satisfy the financial terms. As an example, for asset owners that accept cash, workflow parameter may be configured to ensure that a corresponding workflow has access to cash accounts of the asset owner and asset buyer. In another example, for asset owners that offer funding for a transaction for the asset, workflow parameters may be configured with an indication of a financing set of steps to be included in the corresponding transaction workflow. Financing steps may include, without limitation, an asset valuation step, a lender solicitation step, a terms negotiation step, and the like. Another type of impact on workflow parameters may include broker or other commissions associated with a transaction for the asset. The operator may, through the operator interface 27052 determine that the asset transaction includes an affiliated party, such as a broker, who may be entitled to receive a broker's commission for the transaction. Workflow parameters 27054 for a corresponding asset transaction workflow 27056 may indicate the broker and/or a commission structure.

Figure 281:
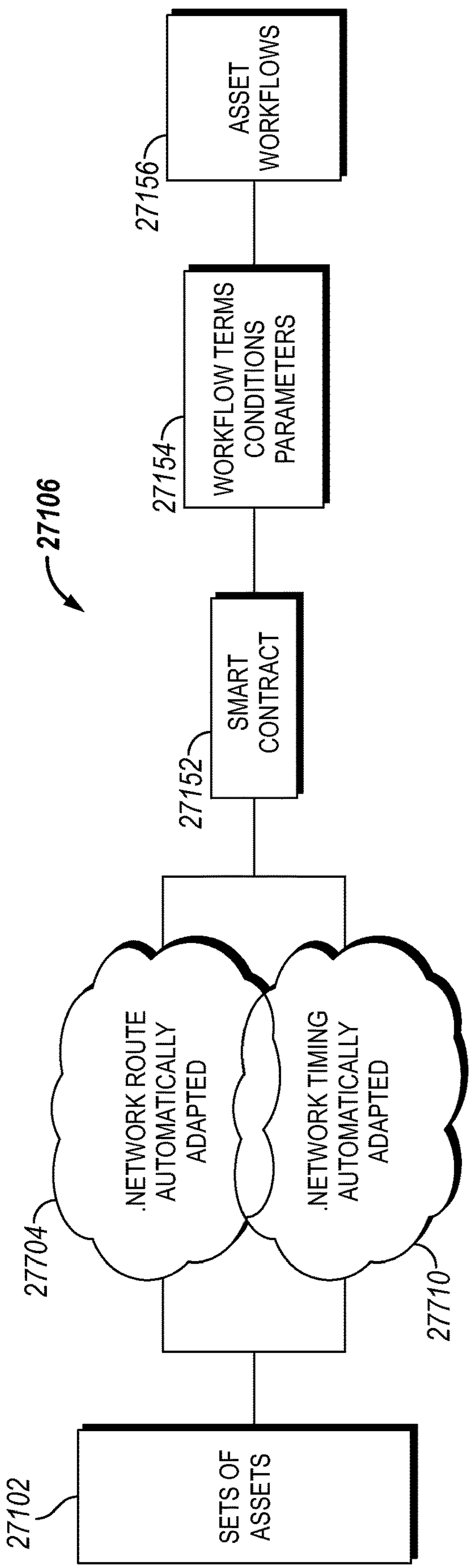

Referring to FIG. 281, a data and network infrastructure pipeline 27104 is configured to deliver data from a set of assets 27102 to an interface for a set of smart contracts 27152. The smart contracts may react to asset data in the interface based on a set of terms, conditions, parameters, and the like 27154. The smart contract terms, conditions, parameters and the like may apply to a set of transaction workflows 27156 involving the assets. The data and network infrastructure pipeline 27104 may include a route-determined path 27704 that is automatically adapted based on one or more characteristics of the asset data and at least one performance parameter of an (initial/model/default/random/third-party prescribed) network path. The data and network infrastructure pipeline 27104 may include a time-determined path 27710 that is automatically adapted based on one or more characteristics of the asset data and at least one performance parameter of an (initial/model/default/random/third-party prescribed) network path.

In example embodiments, terms of a smart contract 27152 may include controlled access to data from the set of assets 27102. A route in the network pipeline 27104 may be adapted to prevent access to the data until a term impacting a workflow 27156 is satisfied. The network route may be adapted so as to deny access to the data based on a condition of the workflow. The network route may be adapted so that requests to access the data before the condition in the workflow is met may be deflected (e.g., rerouted) to a resource in the network that provides a suitable response, such as access is withheld due to a condition in the workflow conditions 27154 not yet being detected by the workflow 27156. In addition to denying access to the asset data based on the unsatisfied condition, the network pipeline 27104 may be adapted to prevent changes to the asset data during the time that the workflow condition is unsatisfied, such as by changing privileges for the asset to restrict access to reading, but not writing to the asset.

In example embodiments, workflows terms 27154 regarding timing of completion of one or more workflows for a transaction for an asset may impact at least one of a route and timing of transfer of data about or of the asset through the network pipeline 27104. A compound transaction or an electronically tradeable asset (e.g., buy and sell) may benefit from adjustment of the network, such as to minimize time between a buy portion of the transaction and a sell portion of the transaction to, for example, mitigate a possibility of an impact on the asset value after the asset is bought and before it is sold.

Figure 282:
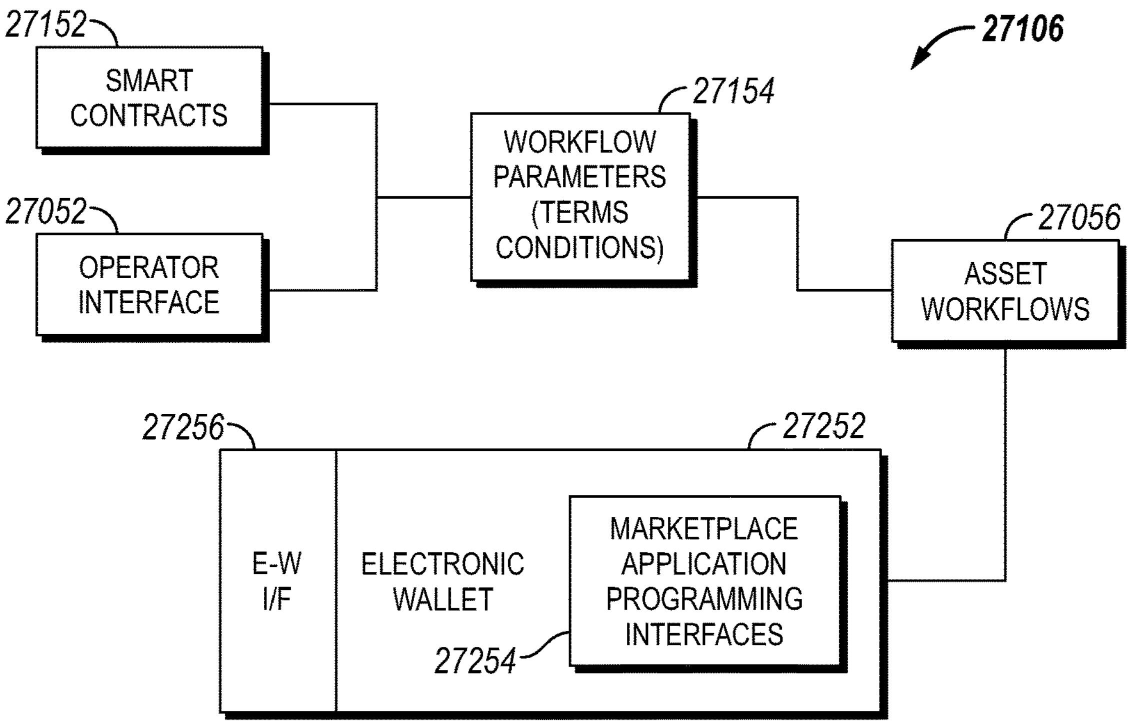

Referring to FIG. 282, methods and systems are described herein as having a data and network infrastructure pipeline that is configured to deliver data from a set of assets to at least one of a smart contract interface 27152 and/or an operator interface 27052 may further have a set of application programming interfaces 27254 to a marketplace 27106 that are configured to be integrated into an electronic wallet system 27252. In example embodiments, interactions with a set of electronic wallet interfaces 27256 of the wallet system 27252 may automatically trigger a set of transaction workflows 27056 within the marketplace 27106. In example embodiments, the electronic wallet system 27252 may control an electronic wallet associated with an entity for settlement of transactions. The electronic wallet system interface 27256 may function to receive one or more signals for the electronic wallet system 27252 about a transaction for the assets 27102. The marketplace API 27254 may be configured to interface with a computing system executing and/or controlling the asset workflows 27056 so that, based on one or more signals (e.g., from the marketplace indicating transaction success) optionally provided through the electronic wallet system interface 27256, a workflow step (e.g., record transfer of ownership of the asset in a distributed ledger) may be automatically activated.

Figure 283:
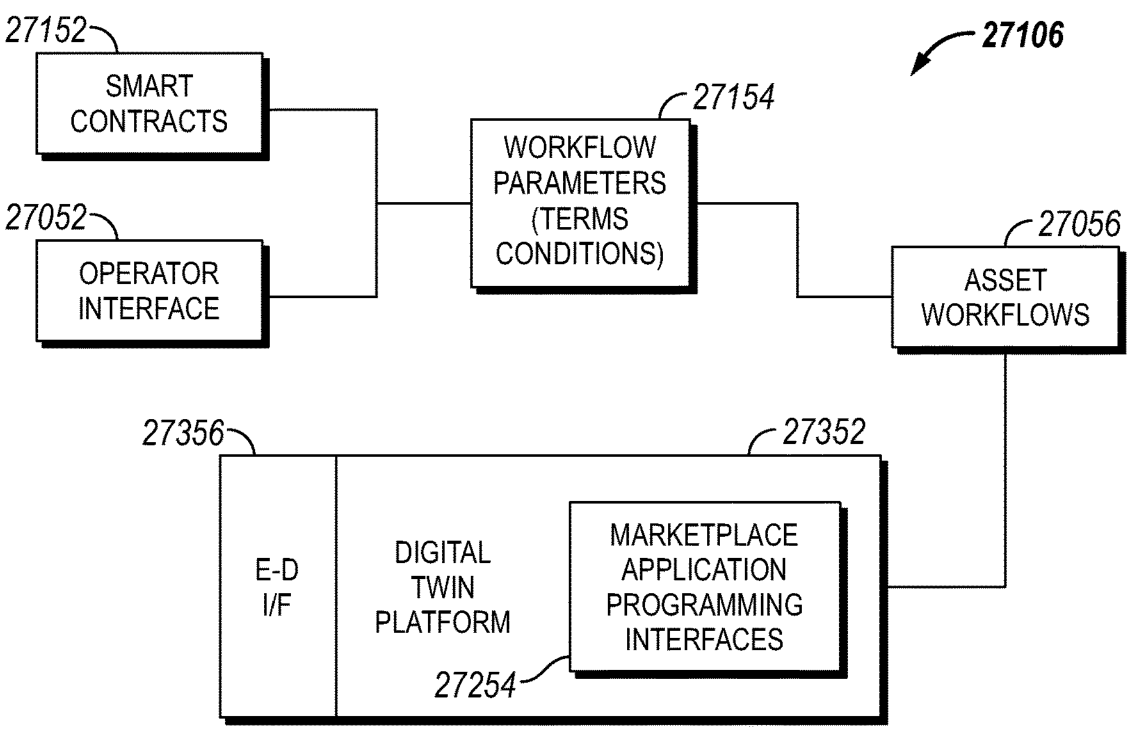

Referring to FIG. 283, methods and systems are described herein as having a data and network infrastructure pipeline that is configured to deliver data from a set of assets to at least one of a smart contract interface 27152 and/or an operator interface 27052 may further have a set of application programming interfaces 27254 to a marketplace 27106 that are configured to be integrated into a digital twin platform 27352. In example embodiments, interactions with a set of digital twin interfaces 27356 of the digital twin platform 27352 may automatically trigger a set of transaction workflows 27056 within the marketplace 27106. In an exemplary embodiment, the digital twin platform 27352 may execute a digital twin of the asset. Activity of the asset may be captured by the asset digital twin in the digital twin platform 27352. The marketplace 27106 may interact with the asset digital twin in the digital twin platform 27352 through the marketplace API 27254 that may be integrated in the digital twin platform 27352. The asset digital twin may be informed by the marketplace 27106 that the assets is presently being transacted. The asset digital twin may signal, through the marketplace API 27254 to activate a step in an asset workflow 27056 that includes authentication of the present transaction for the asset.

Figure 284:
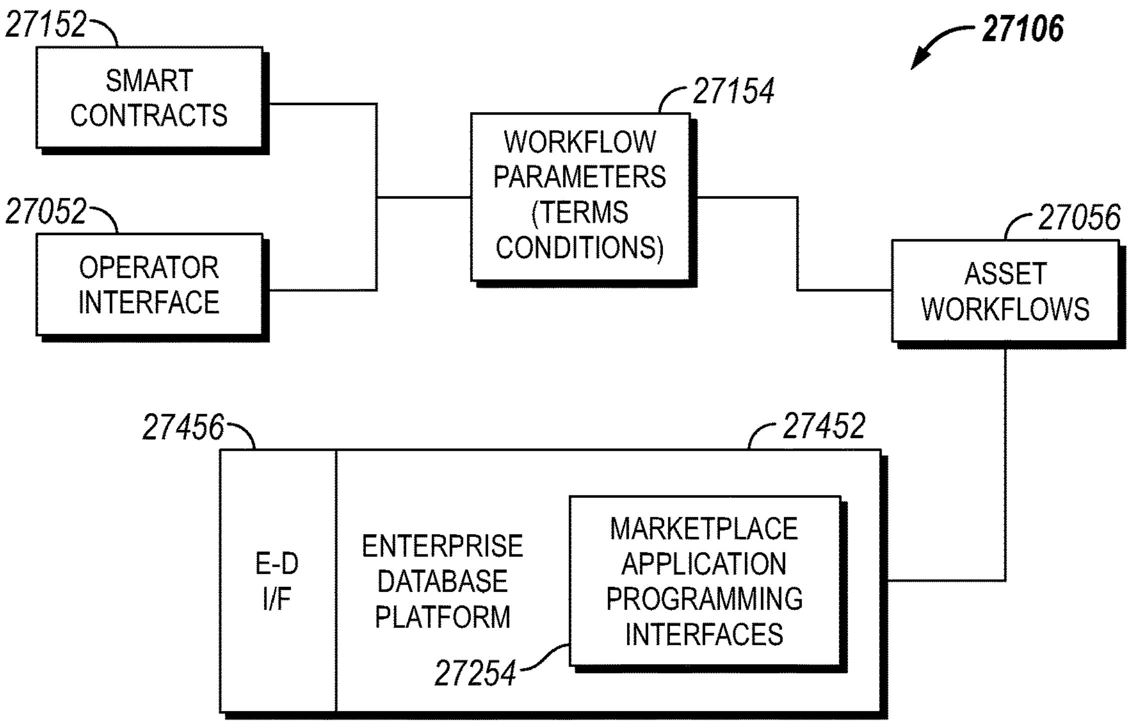

Referring to FIG. 284, methods and systems are described herein as having a data and network infrastructure pipeline that is configured to deliver data from a set of assets to at least one of a smart contract interface 27152 and/or an operator interface 27052 may further have a set of application programming interfaces 27254 to a marketplace 27106 that are configured to be integrated into an enterprise database platform 27452. In example embodiments, interactions with a set of enterprise database interfaces 27456 of the digital enterprise database platform 27452 automatically trigger a set of transaction workflows 27056 within the marketplace 27106. Through integration into an enterprise database platform 27452, the methods and systems of network pipeline 27104 adaptation for routing and/or timing may enable integration into business applications, methods and processes of the enterprise. In example embodiments, business workflows, such as inventory replenishment may include a workflow step that signals to the enterprise database platform 27452 (e.g., through the set of enterprise database interfaces 27456) to conduct a transaction for initiating the replenishment. Through the set of application programming interfaces 27254, the marketplace workflows 27056 a transaction may be conducted (and or an existing transaction may be continued), such as releasing an order for inventory material from a supplier.

Figure 285:
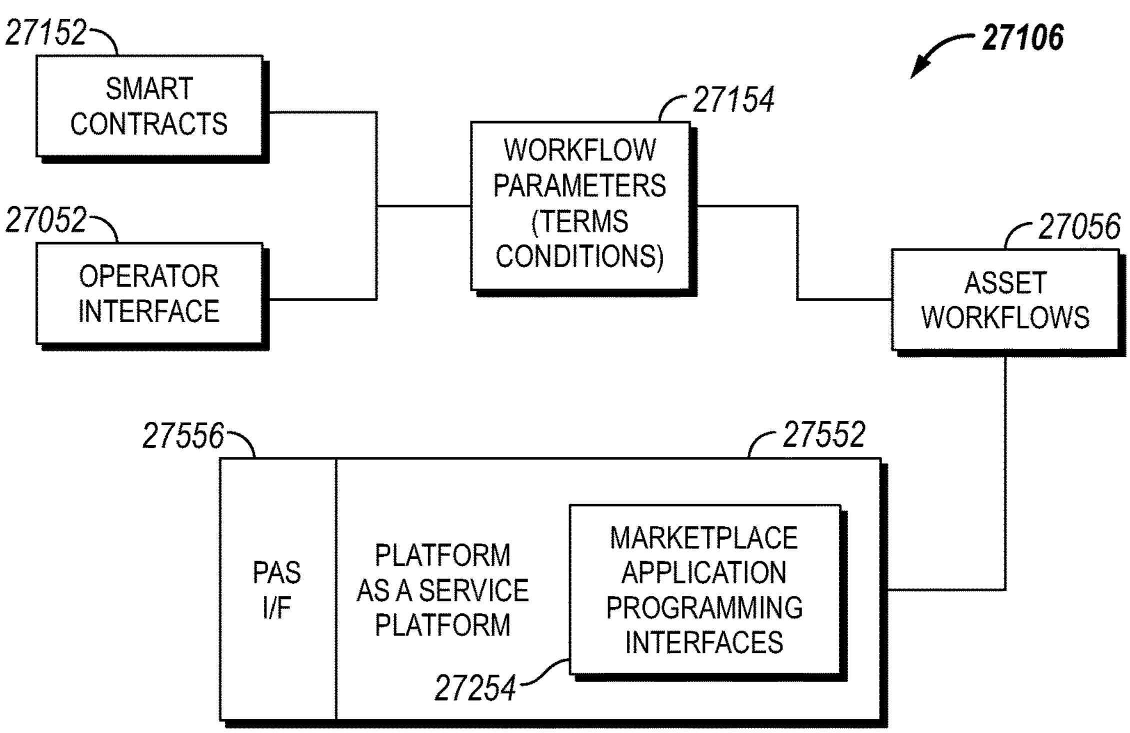

Referring to FIG. 285, methods and systems are described herein as having a data and network infrastructure pipeline that is configured to deliver data from a set of assets to at least one of a smart contract interface 27152 and/or an operator interface 27052 may further have a set of application programming interfaces 27254 to a marketplace 27106 that are configured to be integrated into a platform as a service platform 27552. In example embodiments, interactions with a set of service platform interfaces 27556 of the platform as a service platform 27552 automatically trigger a set of transaction workflows 27056 within the marketplace 27106. In this example embodiment, the platform as a service platform 27552 may receive a request for performing a platform service through the set of service platform interfaces 27556. Responsive to this request, the platform as a service platform may indicate, through the set of marketplace APIs 27254 to activate a transaction workflow 27056 that correlates to a type of service indicated in the request.

Figure 286:
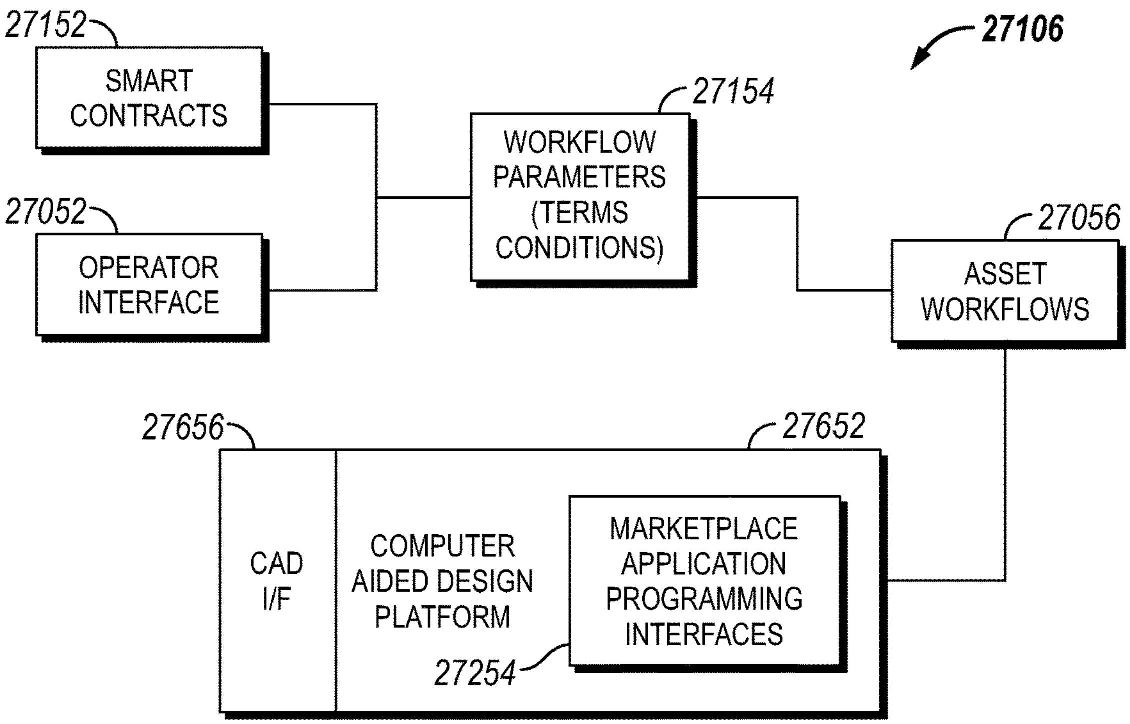

Referring to FIG. 286, methods and systems are described herein as having a data and network infrastructure pipeline that is configured to deliver data from a set of assets to at least one of a smart contract interface 27152 and/or an operator interface 27052 may further have a set of application programming interfaces 27254 to a marketplace 27106 that are configured to be integrated into a computer aided design platform 27652. In example embodiments, interactions with a set of CAD interfaces 27656 of the computer aided design platform 27652 automatically trigger a set of transaction workflows 27056 within the marketplace 27106. In example embodiments, a computer aided design platform 27652 may represent a resource through which an asset-specific transaction workflow might be fulfilled, such as designing the asset, designing aspects of a deployment environment for the asset, and the like. In example embodiments, the computer aided design platform 27652 may perform automated design using a set of criteria provided through, for example the set of CAD interfaces 27656. The automated design may include following a set of workflow steps for producing the automated design that are based on information provided from the computer aided design platform 27652 through the marketplace APIs 27254 to a workflow selector mechanism for adapting a workflow to fulfill the design requirement.

Figure 287:
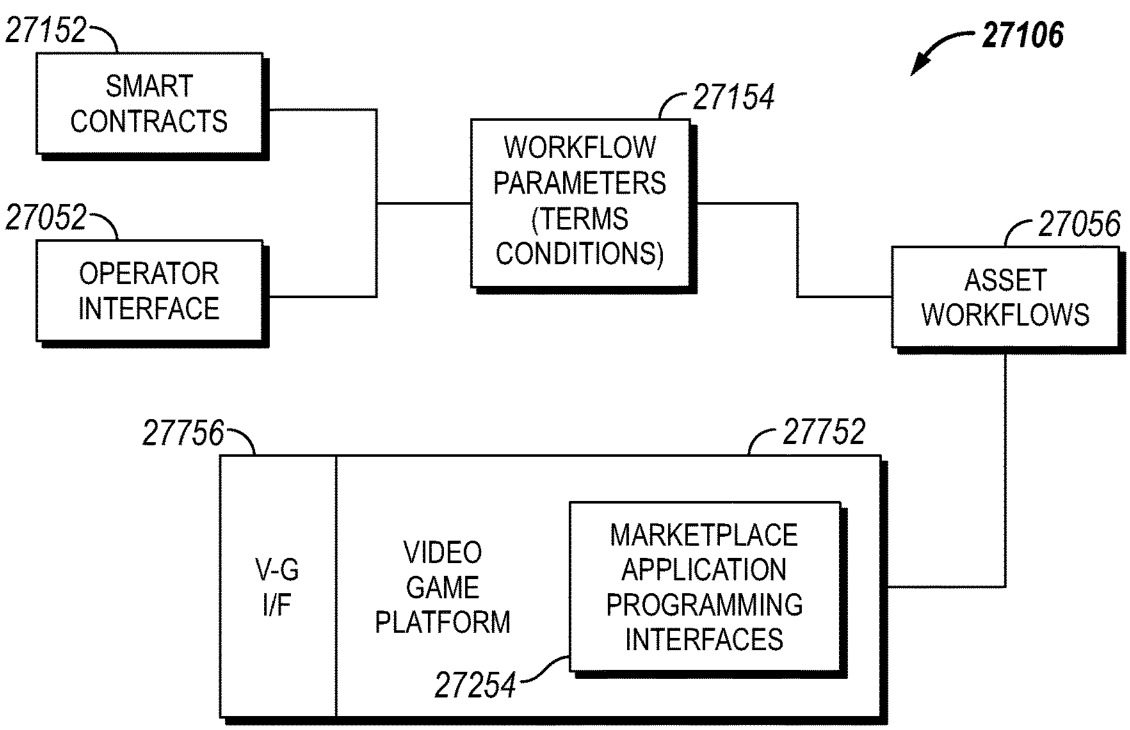

Referring to FIG. 287, methods and systems are described herein as having a data and network infrastructure pipeline that is configured to deliver data from a set of assets to at least one of a smart contract interface 27152 and/or an operator interface 27052 may further have a set of application programming interfaces 27254 to a marketplace 27106 that are configured to be integrated into a video game 27752. In example embodiments, interactions with a set of game interfaces 27756 of the video game 27752 automatically trigger a set of transaction workflows 27056 within the marketplace 27106. Integration of a set of marketplace APIs AP1204 into a video game 27752 may facilitate presentation of sets of assets 27102 available for transaction in the marketplace 27106 in a user interface of the video game 27752. As an example, during use of the video game 27752 a user may identify an asset to be transacted, such as to be purchased in the marketplace 27106 by the user. Through use of the marketplace APIs 27254, a workflow of the marketplace may be activated to fulfill a transaction for the asset on behalf of the game user.

Methods and systems of a route and timing adaptable network pipeline for delivering data from an asset may include a data and network infrastructure pipeline 27104 that is configured to deliver data from a set of assets 27102 to an interface 27052 by which an operator orchestrates a set of parameters 27054 for a set of transaction workflows 27056 involving the assets, wherein the pipeline 27104 is automatically configured to adjust a network path 27704 based on the characteristics of the data and at least one performance parameter of the network path.

Methods and systems of a route and timing adaptable network pipeline for delivering data from an asset may include a data and network infrastructure pipeline 27104 that is configured to deliver data from a set of assets 27102 to a set of smart contracts 27906 that include terms, conditions and parameters 27154 for a set of transaction workflows 27156 involving the assets, wherein the pipeline 27104 is automatically configured to adjust a network path 27704 based on the characteristics of the data/contracts/terms/conditions/parameters/workflows/assets and at least one performance parameter of the network path. In example embodiments, a path may be changed based on meeting one or more conditions of the smart contract. In a production system that produces one or more assets in the set of assets 27102, meeting one or more conditions, such as a level of production quality, may satisfy a quality condition regarding use of a quality monitoring service (e.g., auditing quality of a production system). Based on achieving a level of production quality, sample assets (and/or quality data for assets) may no longer be routed to the quality auditing service/network resource. This change in path of asset data may be affected by the method and systems for network pipeline 27104 operation as described herein.

Methods and systems of a route and timing adaptable network pipeline for delivering data from an asset may include a data and network infrastructure pipeline 27104 that is configured to deliver data from a set of assets 27102 to an interface 27052 by which an operator orchestrates a set of parameters 27054 for a set of transaction workflows 27056 involving the assets, wherein the pipeline 27104 is automatically configured to adjust timing of data delivery based on at least one of a transaction parameter and a network performance parameter. A network performance parameter may include an expected delivery timing for data delivery, a range of data delivery timing for delivering the asset, and the like. A transaction parameter may include a target data delivery time frame, a maximum data delivery time (so that data is received timely), a minimum data delivery time (so that data is received after a minimum time, such as after a specific date/time, and the like).

Methods and systems of a route and timing adaptable network pipeline for delivering data from an asset may include a data and network infrastructure pipeline 27104 that is configured to deliver data from a set of assets 27102 to set of smart contracts 27906 that include terms, conditions and parameters 27154 for a set of transaction workflows 27156 involving the assets, wherein the pipeline 27104 is automatically configured to adjust timing of data delivery based on at least one of a transaction parameter and a network performance parameter.

In embodiments, provided herein are computer-implemented methods and systems for automated orchestration of one or more marketplaces, such methods and systems having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter.

In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a set of application programming interfaces 27254 to a marketplace 27106 that are configured to be integrated into an electronic wallet system 27252, such that interactions with a set of interfaces 27256 of the wallet system automatically trigger a set of transaction workflows 27056 within the marketplace 27106. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a set of application programming interfaces 27254 to a marketplace 27106 that are configured to be integrated into a digital twin platform 27352, such that interactions with a set of interfaces 27356 of the digital twin platform 27352 automatically trigger a set of transaction workflows 27056 within the marketplace 27106. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a set of application programming interfaces 27254 to a marketplace 27106 that are configured to be integrated into an enterprise database platform 27452, such that interactions with a set of interfaces 27456 of the enterprise database platform 27452 automatically trigger a set of transaction workflows 27056 within the marketplace 27106. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a set of application programming interfaces 27254 to a marketplace 27106 that are configured to be integrated into a platform-as-a-service platform 27552, such that interactions with a set of interfaces 27556 of the platform-as-a-service platform 27552 automatically trigger a set of transaction workflows 27056 within the marketplace 27106. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a set of application programming interfaces 27254 to a marketplace 27106 that are configured to be integrated into a computer-aided design platform 27652, such that interactions with a set of interfaces 27656 of the computer-aided design platform 27652 automatically trigger a set of transaction workflows 27056 within the marketplace 27106. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust a network path based on the characteristics of the data and at least one performance parameter of the network path and having a set of application programming interfaces 27254 to a marketplace 27106 that are configured to be integrated into a video game 27752, such that interactions with a set of interfaces 27756 of the video game 27752 automatically trigger a set of transaction workflows 27056 within the marketplace 27106.

In embodiments, provided herein are computer-implemented methods and systems for automated orchestration of one or more marketplaces, such methods and systems having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a set of application programming interfaces to a marketplace that are configured to be integrated into an electronic wallet system, such that interactions with a set of interfaces of the wallet system automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a set of application programming interfaces to a marketplace that are configured to be integrated into a digital twin platform, such that interactions with a set of interfaces of the digital twin platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a set of application programming interfaces to a marketplace that are configured to be integrated into an enterprise database platform, such that interactions with a set of interfaces of the enterprise database platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a set of application programming interfaces to a marketplace that are configured to be integrated into a platform-as-a-service platform, such that interactions with a set of interfaces of the platform-as-a-service platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a set of application programming interfaces to a marketplace that are configured to be integrated into a computer-aided design platform, such that interactions with a set of interfaces of the computer-aided design platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust a network path based on the characteristics of the data and at least one performance parameter of the network path and having a set of application programming interfaces to a marketplace that are configured to be integrated into a video game, such that interactions with a set of interfaces of the video game automatically trigger a set of transaction workflows within the marketplace.

In embodiments, provided herein are computer-implemented methods and systems for automated orchestration of one or more marketplaces, such methods and systems having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter and having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into an electronic wallet system, such that interactions with a set of interfaces of the wallet system automatically trigger a set of transaction workflows within the marketplace. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a digital twin platform, such that interactions with a set of interfaces of the digital twin platform automatically trigger a set of transaction workflows within the marketplace. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into an enterprise database platform, such that interactions with a set of interfaces of the enterprise database platform automatically trigger a set of transaction workflows within the marketplace. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a platform-as-a-service platform, such that interactions with a set of interfaces of the platform-as-a-service platform automatically trigger a set of transaction workflows within the marketplace. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a computer-aided design platform, such that interactions with a set of interfaces of the computer-aided design platform automatically trigger a set of transaction workflows within the marketplace. In embodiments, such methods and systems are provided having a data and network infrastructure pipeline that is configured to deliver data from a set of assets to an interface by which an operator orchestrates a set of parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a video game, such that interactions with a set of interfaces of the video game automatically trigger a set of transaction workflows within the marketplace.

In embodiments, provided herein are computer-implemented methods and systems for automated orchestration of one or more marketplaces, such methods and systems having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into an electronic wallet system, such that interactions with a set of interfaces of the wallet system automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a digital twin platform, such that interactions with a set of interfaces of the digital twin platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into an enterprise database platform, such that interactions with a set of interfaces of the enterprise database platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a platform-as-a-service platform, such that interactions with a set of interfaces of the platform-as-a-service platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a computer-aided design platform, such that interactions with a set of interfaces of the computer-aided design platform automatically trigger a set of transaction workflows within the marketplace. In embodiments, such methods and systems are provided having a data and network infrastructure pipeline that is configured to deliver data from a set of assets to set of smart contracts that include terms, conditions and parameters for a set of transaction workflows involving the assets, wherein the pipeline is automatically configured to adjust timing of data delivery based on at least one of a transaction parameter and a network performance parameter and having a set of application programming interfaces to a marketplace that are configured to be integrated into a video game, such that interactions with a set of interfaces of the video game automatically trigger a set of transaction workflows within the marketplace.

Cross-Market Transaction Engine

There is a huge proliferation of data resulting from the IoT, edge and distributed storage and computation, but more data is not useful if the data overwhelms storage systems, networks for transmission, or human operators with too much noise to be useful. Referring to FIGS. 288 and 289 in embodiments, the platform 100 may include a cross-market transaction engine 28800 configured to enable markets 28802, market platforms 28804, buyers 28806, and sellers 28808 participating in a wide variety of markets to execute transactions and share data via intelligent agents and intelligent data layers 25904. The engine 28800 may discover new data source feeds (including alternative data like crowdsourced data, IoT and sensor data, edge and cloud, and websites), automatically ingest, cleanse, and normalize the feeds such that they can be processed, organize storage of the data (including self-organization based on feedback on outcomes, such as utilization, impact, for example whether new data helps AI perform better, etc.), deduplicate and/or prune the data, summarize or compress the data (such as to optimize storage and/or network transmission), handle access controls, including role-based permissions and appropriate encryption or obfuscation), as well as handling permissions in multi-tenancy situations, perform opportunity mining (such as by testing the impact of adding new data sources on the performance of AI and expert systems), factor in the cost/benefit of adding the data source, perform network-condition-sensitive data acquisition and storage (such as assisting with not collecting more sensitive data than one can transmit, collecting data at the right time of day to transmit, etc.), and/or perform intelligent data location (such as putting the data where the data belongs for an AI model to operate on the data, e.g., as where a local AI system can operate a market function with very low latency on the local data that is “good enough” to get to a good answer, such as the right price for a bid/ask situation. The engine 28800 may perform or facilitate performing one or more of reducing data-sharing risk, securing data provenance, facilitating transaction autonomy, driving ecosystem interoperability, securely augmenting AI, translating value, and parking value. The engine 28800 may reduce data-sharing risk by creating combined sources of information that can be queried and analyzed without providing all users with full access to the underlying data sources or otherwise revealing the underlying data, for example via distributed data storage and associated technologies (e.g., cloud, distributed ledgers, smart contracts, blockchains, and access control systems) with privacy enhancing techniques (PETs). This may include providing aggregated results that do not provide access to individual data elements (such as to protect the privacy of a user or individual proprietary units), providing obfuscated results, providing summaries, providing partial results (e.g., reduced-granularity image or sensor data), and/or tuning results to roles, permissions, or other parameters of a requesting party or system.

The engine 28800 may secure data provenance by facilitating creation and/or management of a blockchain-based distributed ledger, thereby creating immutable sources of information that allow for tracing the provenance of information (e.g., data from IoT devices sent over 5G networks), more easily reconciling data with collaborators, and minimizing the risk of information being doctored by malicious actors. Data provenance may also be facilitated by embedding or wrapping data elements in metadata that indicates or validates provenance, such as a digital fingerprint or signature that is unique to the data source (e.g., wrapping sensor data for a time period with a digital signature that embeds a unique characteristic of the device or system that was used to capture the data, the environment in which it was captured, or an item about which the data was collected).

The engine 28800 may facilitate transaction autonomy by facilitating creation and/or management of smart contacts on one or more distributed ledgers, thereby reducing the effort spent manually reconciling agreements and processing transactions (as they happen automatically) and allowing for real-time and autonomous payments to flow to different types of partners upon completion of specific contractual terms. Transaction autonomy may also be facilitated by a set of autonomous agents, such as robotic process automation systems that are trained on a set of user actions (such as a training set of user interactions with one or more software systems that are used to enable transactions), such that elements of a transaction that historically required manual or human interactions are undertaken by the agents.

The engine 28800 may drive ecosystem interoperability by standardizing various connectivity methods (e.g., Open API initiative, NACHA’s API standardization), outsourcing to as-a-service providers (e.g., those accessible via the cloud), sending financial instructions, and/or embedding products into non-financial contexts.

The engine 28800 may securely augment AI by employing privacy-enhancing techniques to allow AI models to be trained (using task-specific hardware) on sensitive information without exposing training, which may be beneficial, for instance, in creating collective transaction monitoring models without exposing sensitive transaction data to competitors. The privacy-enhanced training data communication allows for building robust artificial intelligence models using large amounts of data from partners without compromising privacy and security. AI models may be augmented by a governance system, such as one that governs the training data set and/or a set of outcomes that results from application of the AI to the training data set, such as to avoid replicating bias in training data sets in the outcomes of models, to provide expert checks and balances on automated systems, to ensure compliance with regulations (such as privacy regulations, data location regulations, and operational regulations that apply to activities that are undertaken based on the outputs of the AI models).

The engine 28800 may facilitate translation and parking of value by providing a plurality of markets with access to and sharing of technologies that provide insight into the “right” exchange rate, e.g., between native currencies of respective markets and exchange rates across markets, as well as provide insight into the value (as expressed in various units of value) of in-market entities like data, lifetime value of a customer, cost to acquire a customer, targeted advertising rates, goods, services, credits, offsets, tokens, loyalty points, collateral, labor, work products, credit costs (borrowing or lending), and many others. The engine 28800 provides such exchanges with better solutions that can be enabled by more/richer data (including in intelligent data layers), better automation (including using agents and models that are trained on data and that use AI), and/or better analytic and AI systems that facilitate insight into transactions, workflows, value-creation and other elements of a successful marketplace.

In embodiments, the engine 28800 may facilitate one or more processes by which market values of a set of tokens (such as NFTs, fungible tokens, or others) may provide a translation function between markets. The token market values may be measured according to one or more cryptocurrencies, fiat currencies, points systems (e.g., rewards or loyalty points), or a combination thereof. For example, value of a painting may be measured versus value of an event ticket by their respective cost as reflected in the same token, cryptocurrency, or fiat currency. In embodiments, a set of tokens may be designed to provide better insight about exchange value than traditional currency or generalized cryptocurrency, such as where a token is managed by a set of market orchestration rules and/or smart contracts that take real-time data from a set of market entities that indicate value. In embodiments, this may include populating the systems that govern a token with data from a digital twin that reflects the current or real-time condition of a set of real-world assets, such as based on sensor data, human-entered observational data, or any other data.

In embodiments, the engine 28800 may facilitate one or more processes by which a parameterized smart contract may be configured to define one or more value ranges for in-kind exchanges across markets. The engine 28800 may periodically spider available marketplaces to find a preferred set of potential exchanges.

In embodiments, the engine 28800 may be configured to embed financial products in non-financial contexts, and/or embed non-financial products in financial contexts. Non-financial players can be incentivized to create exclusive arrangements to embed only a particular institution's product, giving them direct access to captive customer pools and exclusive data. This addresses a challenge that financial institutions face when financial products are embedded into a third-party platform, in which case the institution may risk losing direct customer touchpoints, limiting the ability to build deeper relationships (e.g., advisory relationships between a bank and its high-value customers). In embodiments, advances in connectivity technology and standardization allow financial products to be natively integrated into non-financial contexts. For instance, a financial product may be delivered simultaneously with a non-financial one (e.g., parametric insurance may be built into a home purchase contract) or offered natively on the platform of a partner (e.g., gig-work app making short-term loans). Examples include machinery as a service, printing as a service, and other subscription models. Integration or embedding of financial and non-financial products and services with or into each other may be improved by combination with any of the elements described herein, such as: access to a set of intelligent data layers that provide automated, high-quality, real-time data to parameterize financial or non-financial data, such as to inform a smart contract relating to the embedded or integrated offering; presentation of offerings in improved interfaces or formats, such as digital twins, enhanced wallets; augmented, mixed, or virtual reality systems; and/or digital transaction interfaces embedded in or on physical goods or at a point-of-sale; and/or automation, orchestration and/or optimization (such as by AI) of offer and acceptance, contract terms, fulfillment, and other workflows involved in a transaction.

In embodiments, the engine 28800 may be configured to embed data about physical processes into financial products to improve risk and value assessment, assure the identity of transaction participants, validate provenance of physical information, and optimize product and information distribution. This may include sensor data, data collected from infrastructure elements (such as the environment of storage, transportation, sale or use of a product), data collected from operators or observers, market data (including reviews, surveys, ratings and recommendations), demographic data, and many others as disclosed throughout this disclosure and the documents incorporated herein by reference.

The engine 28800 may embed data about financial products into physical products, infrastructure, and processes. For example, in a project finance or reinsurance transaction, one or more parties can be informed by performance metrics and associated costs related to real assets. The engine 28800 may employ a blockchain to circumvent and democratize project finance and insurance. As such, the engine 28800 may provide insurance and project planning to one or more parties, thereby supplying real data that can be used to determine risk and risk management, e.g., as part of a reinsurance mechanism.

In embodiments, the engine 28800 may be configured to validate and/or authenticate data or specific types of software code before incorporating the data with a larger data set (e.g., personal data) or adding the code to a platform (e.g., validating software code). With the increased security issues such as identity theft and use of false online identities as well as malicious actors trying to hack or input viruses, there is a need for validation provenance of physical information. There is a need to use various external information (from user associated data, user's device associated data, or external data related to particular user). External data can be, for example, various personal data at any level such as home address, phone number, car, where is user born, SSN, etc. External information may be biometric. Such examples include, but are not limited to fingerprint, palm veins, face recognition, DNA, palm print, hand geometry, iris recognition, retina and odor/scent. The engine 28800 may identify information to be used from users and/or user devices randomly.

The information may be a combination of both user data and user device data. Process of authentication may be checked frequently from users either randomly or for each transaction, thereby potentially eliminating the ability for a robot (e.g., script, program, RPA, AI, and the like) to falsify user data to be incorporated, e.g., in cases where the robot cannot be validated and, and may eliminate the robot user from attempting to communicate with the system, e.g., indefinitely.

By way of example, the engine 28800 may be configured to provide automobile dealers with data associated with vehicle maintenance, service intervals, costs, etc. based in part on real-time or downloaded data. The models may be fed into vehicle pricing, warranty costs, and risk assessments, extended warranty offerings, etc. conducted by auto manufacturers and dealers. Similar models can be applied to any connected device/product, where specific cost, types of risk, use cases, user profiles, and similar data and analysis models can be applied and priced to offer customized services that are much better than the standard question at the cash register and/or at an electronic point of sale, such as extended warranties, insurance options, and the like.

By way of another example, the engine 28800 may use embedded data to facilitate the availability of reduced auto insurance rates based on driving habits. The engine may make available and/or create independent data streams, and/or develop independent risk assessments and cost models, which in turn may create a new market and/or enhance existing markets warranty, purchase negotiation, insurance, and other services, as well as making these services more transparent. The engine 28800 may apply datasets and models to nested products or parts for more accurate cost and risk models, and may, in embodiments, add in customer input data collected from connected devices for richer data.

The engine 28800 may provide notifications to customers for maintenance, upgrades, services, etc. based on real-time status of the product/device. The engine 28800 may present and/or visualize options as cost-tradeoffs (e.g., risk, cost of replacement, etc.) associated with a product or service. The engine 28800 may provision related smart contracts with product users based on how a product is maintained, used, e.g., the type of data supplied, etc. Also, the engine 28800 may provide transparent consumer or other product ratings.

In embodiments, the engine 28800 may be configured to provide trustless disjointed data pools and/or disjointed data pools that meet high trust demand. Shifts in attitudes towards data privacy are causing a reassessment of the major institutions and a growing number of data regulations are requiring institutions to give back control over information to consumers. This creates an explicit trust gap that will drive fundamental reshaping of how individuals and businesses manage their data and creates an open opportunity about who may help them simplify and orchestrate this management: generally financial institutions are well-poised to play this role. Other than in a trustless environment (e.g., DLT) a trusted intermediary (e.g., financial institution) with high security standards will have a distinct advantage by helping customers manage access to disjointed (i.e., held with multiple different parties), highly sensitive data. Examples include consumer banks increasingly integrating with other apps and personalization services In embodiments, the engine 28800 may be configured to provide proxies, i.e., "back doors," into data sources. ISPs, exchanges, etc. will look for "back doors" or proxies to data sources that might become increasingly regulated and/or customer controlled. For example, the right collection of IoT data sources, aggregated intelligently, might tell one as much about a customer's behavior and interests as would historical data sets like surveys and POS data.

In embodiments, the engine 28800 may develop ways to automatically calculate performance metrics of a particular product based not only on its use, but how it is used in conjunction with other connected products in a home or personal environment. The engine 28800 may thereby produce a rich and valuable set of available data which can be part of an available data stream subscription asset.

In embodiments, the engine 28800 may facilitate gathering, sharing, marketing, transacting for, and/or securing aggregate and/or individual medical data. Overall healthcare relies on this data; for example, testing results with COVID are widely available through the test labs. This information has been central to the management of the deployment of treatment and disease management programs. For example, the engine 28800 may facilitate analysis of outliers for vaccine administration. There are small numbers of people who may develop side effects, and these individuals need careful medical study to discover if there may be clues to other risk factors. Individuals may share health information and/or become part of a study to find clues to additional risk factors. The engine 28800 may facilitate acquisition of HIPAA compliance and other privacy concerns In embodiments, the engine 28800 may facilitate gathering, sharing, marketing, transacting for, and/or securing data used to determine effectiveness of a treatment program.

In embodiments, the engine 28800 may facilitate using pharmaceutical, supplements, devices, sales, demand data, etc. in geographic area to infer protected health data for a population. For example, if an area has increased insulin sales, it can be assumed that diabetes cases are higher in that area than average areas. The data may be obtained from manufacturers (e.g., via quarterly reports). Other types of data may be indicative of overall health of a population or demographic, such as profitability or revenue of "bad" for health products v. "good" for health products. For example, alcohol, nicotine, fast food, streaming services, etc. v. health food stores, gym memberships, etc. The engine 28800 may implement machine learning, AI, and/or intelligent agents to identify more latent products that correlate with "good" and "bad" health outcomes and use the identifications to infer health data of populations.

In embodiments, the engine 28800 may facilitate gathering, managing, and/or transacting of personal location data from cell phone traces. Personal location information can be highly sensitive, and increasing use of that data by, for example, social media communities, may lead to a counter-response to further limit use of that data. If cell phone location tracking data becomes constrained, or even barred, for some purposes, proxies may be needed for a wide range of location-based applications. The engine 28800 may create and/or manage proxies including one or more of ride sharing, delivery services, location-based promotions and advertising, navigation, routing, and the like. Proxies for the data may include aggregation and averaging of location data across time or groups of people, such as to provide a statistical prediction of the most likely location. The engine 28800 may determine locations by infrastructure, such as image classifiers, such as for recognizing public location events by camera, while keeping private location information secret. The engine 28800 may gather, analyze, and/or disseminate transaction data and/or metrics related thereto to provide insight into patterns of location, such as in-store purchases. Data about job location, school location, and the like can be used to predict location, including based on patterns.

In embodiments, the engine 28800 may facilitate managing and/or transacting for data from a visual edge and/or data inferred from cameras. The engine 28800 may gather information from camera data and extract and use the data without revealing underlying pictures. The data may be abstracted for specific purposes, thereby preserving privacy or regulated data and information. Cameras are everywhere and the ability to sell abstracted data may be used by users for, for example, trucks leaving warehouses, patrons visiting retail locations, foot traffic, assets moving inside facilities or mining/construction sites.

In embodiments, the engine 28800 may facilitate managing and/or transacting for universal data contracts that apply to online services companies.

In embodiments, the engine 28800 may include an obfuscation module 28810 configured to obfuscate aggregated, anonymized data. What is considered anonymized or blinded data is likely to change, and narrow, in the near future because data that has historically been blinded in isolation (such as by removing personally identifiable information [PII]), is now increasingly used in combination with other data sources, and when combined with other data, the aggregate contains sufficient information, and is so granular in some respects, that the anonymity is lost. For example, location data, occupational data, age data, and the like for a group of individuals may be anonymized, such as by removing names, birth dates, and the like; however, at some point the threshold is crossed when there is probabilistically, for example, only a single lawyer at location X who could have traveled from Y, is age Z and so forth, so that determining personal information via aggregated data can be accomplished by ascribing to that single lawyer all of the attributes contained in the aggregated data set for lawyers at location X, from Y of age Z, etc. This has lots of implications for basic privacy law compliance, such as with respect to HIPAA, European data privacy laws, and many others. For example, data brokerage practices are likely to change, as data brokers may run afoul of privacy regulations depending on how they are aggregating "anonymous" data. In embodiments, this may be handled by machine learning and other tools (trained by deep learning on outcomes, learning on labels or feedback, supervised learning, semi-supervised learning, training on expert human interactions (such as using robotic process automation, or other techniques), such as to automatically undertake under supervision, or to recommend how to do one or more of the following: partition data into partitions that satisfy threshold requirements for maintenance of anonymity, segregate sets of data or otherwise prevent combination of such data sets (or elements therein) to the extent that the data set tends to expose information that is required to be kept private; aggregate data sets into larger pools from which it is more difficult to infer private information; set thresholds of granularity (such as location groupings) at sufficiently low settings such as to make it sufficiently difficult to infer specific information that is required to be held private; test data sets (such as with respect to parameters of aggregation, granularity, partitioning, and the like) to produce metrics of security and/or vulnerability to privacy invasion; introduce elements that increase uncertainty as to whether individual information can be correctly inferred (such as fictional names, occupations and the like that are unlikely to diminish performance by systems that are undertaking appropriate uses of the data set, but that would tend to interfere with uses that are seeking to infer private information); and the like. These actions can be applied to various data sets, data pools and types that contain privacy-protected information or that should not be combined for other reasons. In embodiments, a set of methods, systems and models may be provided, which in each case may be used as a foundation or seed for development of a set of automated agents (such as through robotic process automation), to undertake various actions that may support or enable more sophisticated and/or compliant usage of aggregated data, such as to: predict what missing data sets or types would be needed in order to approximate, or to directly infer identifying information or other sensitive attributes of an individual person, a type of person of interest, or the like; provide a set of incentives, or present appropriate disclosures, terms, conditions and the like, in order to induce a person of interest to consent to inclusion of personal data in data sets and/or to consent to aggregation of personal data into larger data sets; refine or regulate usage of aggregate data sets, and permissions thereof, such as to refine for what purposes aggregate data may be used when there is some risk of inference of personal or private information (such as where aggregate data is permitted for medical research, but not for marketing); and others.

Increasingly, a wide variety of activities and systems involving personal data sources, such as targeted advertising, workflows involving consumer IDs, web cookie acceptance, location data gathering/retention, health care activities, human resources activities, website utilization, online personal data gathering, surveys and research activities, are subject to regulation. The EU has been leading the world in passing regulations governing which types of data businesses can collect. Some types of data are allowed with consent by the consumer, while others (such as data regarding minors) are prohibited altogether or require consent by a parent or guardian. Businesses and advertisers may use gamification, promotional offers and/or reward/loyalty program strategies to incentivize consumers to give consent to having their browsing habits tracked by an ad/consumer ID and/or have data already linked to their ad/consumer ID be used to modify their web browsing and/or app using experience. For example, a consumer may be offered credits for browsing one or more websites while having personalized data collection enabled. These credits may be redeemable by the consumer for digital and/or physical goods. Businesses and/or websites may collaborate with one another to offer unified incentive systems across each of them.

Further examples of data which may be obfuscated via the obfuscation module 28810 may include: the signature of power usage across home/business/enterprise premises and/or systems from the panel (such as with the ability to see each appliance/computer/AC-system/generator come online, such as based on the signature of these premises and/or system activities existing in the waveform of AC consumption relative to other units); wearable data (such as by using augmenting data from infrastructure and cameras to serve as proxies for activity and energy, etc.); ethnicity and/or race data (which may be used to anonymously identify these groups of people and trends related to transactions they pursue/involved in and/or how they may be impacted by transactions in a variety of fields); political affiliation and/or religious/philosophical affiliation data (such as by determining whether associations between these groups of people relate to any number of viewpoints from political/religious/philosophical affiliations); social media data (such as by using one or more AI agents to classify or otherwise characterize social media presence of an individual and/or a cohort around the individual); medical or health data (such as by inferring a diagnosis from a combination of image or camera data with other data, such as wearable device data, shopping data, behavioral data, or the like); and many others. While there may be benign or beneficial uses of such inferences, there are potentially harmful effects as well, such that many users may wish to be shielded from usage of such inferences except where they are aware of the usage and have given consent.

In embodiments, the engine 28800 may facilitate one or more processes by which the obfuscation module 28810 may process and/or analyze one or more data models for one or more markets, goods, services, users, market makers, market datasets, etc., to determine data instances, aggregates, etc. of the data models that may be sensitive for regulatory purposes. The obfuscation module 28810 may, for example, determine one or more datasets, instances, aggregates, etc. that may be or include personally identifiable information relevant to HIPAA, financial privacy regulations, European data privacy regulations, California data privacy regulations, etc. The determination of personally identifiable or otherwise sensitive information may be performed via one or more rule-based systems and/or intelligent systems (e.g., AI, ML, ANN, intelligent agents, via proxies, patterns, teachings, etc.). For example, the obfuscation module 28810 may include an artificial neural network configured to train on one or more datasets and thereby learn types of data that are sensitive. The obfuscation module 28810 may then identify sensitive data and perform one or more obfuscation operations and/or classify or flag the data as sensitive data.

In embodiments, the engine 28800 may facilitate one or more processes by which the obfuscation module 28810 may include an obfuscation module configured to perform one or more obfuscation operations to obfuscate data identified as, determined to be, flagged as, and/or classified as sensitive data. The obfuscation operations may be or include one or more of redaction, replacement, addition (such as of fictional elements), partitioning, separation, augmentation, aggregation, noise addition, random rounding, and/or encryption. Redaction may include, for example, eliminating identifiable elements from datasets and/or models. Replacement may include, for example, replacing sensitive data with proxy data, random data, hypothetical data, and/or anonymized data representative of the replaced data. Partitioning may include, for example, adjusting partitions, increasing or decreasing number or granularity of partitions, and the like. Separation may include, for example, separating data elements that are sensitive, such that they are excluded from aggregation. Augmentation may include tagging data elements that are particularly sensitive, adding metadata to data elements, or the like, such as to flag them to aggregation programs, to set parameters for aggregation, to set policies for aggregation, or the like. For example, data elements in a data set may be augmented with a set of policy metadata governing how those elements are permitted to be used, such that data aggregation systems or other systems may consume the policy elements and undertake aggregation consistent with the policies. In embodiments, policies may be maintained and automatically updated by a policy engine, such that metadata elements are automatically updated when policies change, such as governing rules of a region, nation, state, or other entity. Aggregation may include, for example, aggregating data to meta-level content from which determining personally identifying information is difficult or impossible. Noise addition may include, for example, adding an amount of noise to the sensitive data such that the sensitive portions of the sensitive data are difficult and/or impossible to identify, trace, determine, parse, etc. Random rounding may include, for example, randomly rounding values, including totals, either up or down (e.g., to a multiple of '5' or '10.') To understand randomly rounded data, one must be aware that each individual value is rounded. As a result, when the randomly rounded data are summed or grouped, the total value may not match the individual values, since totals and sub-totals are independently rounded. Similarly, percentages calculated based on rounded data may not necessarily add up to 100%. Encryption may include, for example, applying one or more cryptographic processes to the sensitive data such that the sensitive data cannot be accessed, read, modified, marketed, etc. by untrusted parties.

In embodiments, the engine 28800 may facilitate one or more processes by which the obfuscation module may perform the aggregation obfuscation operation according to one or more aggregation hierarchies having a plurality of aggregation levels. The obfuscation module 28810 may determine one or more aggregation levels that may be appropriate for an aggregation obfuscation operation according to rules, regulations, preferences, etc., that are applicable to and/or appropriate for the sensitive data being aggregated. Aggregation levels may include, for example, ZIP Code +4, ZIP code, neighborhood, city, state, county, province, department, country, global region, etc. Determination of appropriate aggregation level for a particular instance of sensitive data may be performed by one or more of the intelligent systems based on one or more attributes of the sensitive data. This may include determination by a robotic process automation system that is trained on a training set of interactions by a set of human experts and/or by a deep learning system. Aggregation levels may be tested, such as by a deep learning system or other learning system that is trained to attempt to infer sensitive data from data sets, including by seeking additional data sets that, with further aggregation, facilitate inference of private information. Such as testing system may provide a set of recommendations, or inform a model, such as one that indicates relative risks for permitting aggregation of a given type of data set, a particular data set, a level of granularity, or the like.

In embodiments, the engine 28800 may facilitate one or more processes by which the obfuscation module 28810 may use one or more intelligent systems (e.g., AI, ML, ANN, DPANN/MEANN, intelligent agents, via proxies, patterns, teachings, etc.) to determine whether sensitive data on which one or more obfuscation operations have been performed has been satisfactorily obfuscated. Upon determining that the sensitive data has not been satisfactorily obfuscated, the obfuscation module 28810 may perform one or more further obfuscation operations on the sensitive data. For example, the obfuscation module 28810 may determine that data includes personally identifiable information that violates one or more regulations. The obfuscation module 28810 may perform one or more obfuscation operations on the data to obfuscate the personally identifiable information via the obfuscation module, and then determine whether the personally identifiable information remains determinable within the data after the obfuscation operation has been performed. If the personally identifiable information remains determinable, the obfuscation module 28810 may perform one or more further obfuscation operations via the obfuscation module on the data and repeat the determination process.

In embodiments, the engine 28800 may be configured to provide tools to help customers make better financially linked decisions. White-labeled players across industries are driving standardization of, and margin compression in, core product lines; in this environment, advice and ancillary services can become key differentiating factors, helping customers conveniently make important decisions. Ecosystem connectivity will help institutions access non-standard data about customers to further tailor and improve offerings. Institutions can work with ecosystem partners to deliver personalized tools, recommendations, and access to ancillary services to help clients make non-financial decisions that are linked to their financial well-being. Examples include consumerization of business, and consumer examples such as automated financial tracking, credit awareness, subscription optimization, couponing, recommendations, and the like.

In embodiments, the engine 28800 may provide tools to help commercial customers and consumers alike make better financially linked decisions. On the consumer side, a consumer may provide spending data and/or investment data as well as non-financial data to the tool, which may then analyze non-financial data with spending data and/or investment data to provide recommendations that improve the financial situation of a user. For example, a customer may provide a monthly spending report, which may show a monthly car lease payment, mortgage payments, etc. The customer may have also provided non-financial data, such as travel plans, vacation days, work travel, lease agreements. The tool may run models that optimize a monetary parameter given the information provided by the user. By way of further example, the tool may determine that the consumer should either fly or rent a car rather than drive their car to their vacation location, as the mileage costs may exceed the price of a flight or a rental. In another example, the tool may recommend the best dates that a user should request for vacation and/or locations to travel to so that the user may reduce the cost of a vacation. In another example, a user may provide information relating to their television viewing habits as well as their subscription services, and the tool may determine a schedule when the user may cancel certain subscriptions and/or add new ones to ensure that they are watching the content they like, but not paying for subscriptions that the user does not need at a particular time.

For commercial users, the engine 28800 may identify measures that an organization may undertake to reduce burn rate. For example, if multiple business units are subscribing to different but overlapping services, the tool may recommend that the business units use a different product that covers all the services or may recommend that one unit switch service providers to another service provider. In this example, the tool may calculate the savings over a period of time to show the overall cost to the business by accepting the recommended action. In another example, an organization may provide addresses of its employees (or general locations), a role/team of each employee, and public calendar items of the organization/employees. The tool may identify employees who may provide more output if they are allowed to work from home, flex scheduling for employees in the office by team/meeting schedules, or the like. Using this tool, the organization may improve productivity for certain employees or teams, while reducing their office space which provides financial savings.

In embodiments, in order to identify financial outcomes linked to non-financial actions, the engine 28800 may employ different means of identifying the links. For example, the system may include an "expert-sourced" library that provides non-financial actions that can be performed in different scenarios to obtain better financial outcomes. Additionally or alternatively, the system may employ machine-learning techniques to identify more latent non-financial actions that are tied to verifiably "better" financial outcomes. In these embodiments, the system may use data from a collection of different sources (which may depend on the "class of user"), where the data includes financial signals as well non-financial signals. The engine 28800 may use appropriate AI/ML algorithms, such as those described herein, to identify the non-financial signals that are most strongly correlated with the positive financial signals and/or the negative financial signals. The identified signals and/or correlations may be applied into AI systems to assist clients in making decisions. For example, a user may provide non-financial data to the engine 28800, and the engine 28800 may identify scenarios where the user may take certain non-financial actions that were determined to be linked to positive outcomes and/or non-actions that could be taken by the user to avoid negative financial scenarios.

In embodiments, the engine 28800 may link data gathered about a customer in one market to a related market. For example, data related to customer preferences about a house may be extended to a marketplace for home design services.

In embodiments, the engine 28800 may project long-term financial outcomes for decisions that provide a clearer "lifetime projection" across outcomes (e.g., by factoring in the costs of emergency care for a pet or non-routine maintenance for a system, averaged across a population and with indicators of the "worst case" situations). As such, the engine 28800 may help users understand "ratchet" effects, or implications of commitment or situational dependence on one or more market conditions.

In embodiments, the engine 28800 may be configured to facilitate securitization of future revenue streams. Securitization of future revenue streams allows companies to grow without shareholder dilution by financing their recurring receivables, provides for capital infusion by exchanging predictive, recurring revenue streams in exchange for discounted advance funding, and allows companies an alternative to the significant discounting found in other forms of single payment used as an inducement for customers to switch from recurring monthly to single payment. The engine 28800 may facilitate offering an instant cash advance against the full annual value of a company's subscriptions or source of recurring revenue. Examples of sources include real estate, SaaS or any as-a-service business model, advertising slots, and any other suitable business sector or model that allows for monetizing long term revenue streams without offering discounted incentives.

In embodiments, the engine 28800 may automatically configure a set of smart contracts to calculate a revenue share related to a set of assets and allocate a fraction, such as fixed, formulaic (e.g., based on time or other variables, including dynamically determined) to a distributed ledger, whereby the revenue share is redeemable, such as based on a token that represents the right to redeem the revenue share. The revenue share calculation may be based on available data, including accounting data or utilization data (e.g., as computational cycles used if the asset is a server, views or clicks if the asset is an advertising spot, salary/bonus for an individual, royalties for an item of IP, rent for an item of real property, dividends for securities, etc.). A token representing the redemption right in the smart contract may trade in a marketplace, the price of which may reflect a set of parties' predicted value of the future revenue stream. The engine 28800 may employ AI, RPA, intelligent agents, or a combination thereof, to operate on disparate data sets across markets to predict future revenue, adjust initial pricing, recommend trading activities, automate arbitrage activities, aggregate positions (e.g., to hedge risk and/or optimize a risk/return profile), and govern trading rules with respect to the token. Custody of assets may be governed by a secure set of automated, custodial agents. Sets of assets may be virtualized into working groups, with revenue share being allocated at the group level.

In embodiments, the engine 28800 may facilitate one or more processes by which a basket of revenue shares may be constructed and automatically maintained by an intelligent agent, such as a basket of rents, royalties, dividends, interest payments, annuity payments, and others.

In embodiments, the engine 28800 may facilitate one or more processes by which an AI system may optimize the basket, such as based on a target risk/reward profile or asset allocation, feedback on outcomes, (e.g., yields), contextual data (e.g., on market conditions, asset conditions, process states, and other data about marketplace entities), and other factors.

In embodiments, the engine 28800 may perform contract enforcement and dispute resolution services in cross-market environments, such as environments where physical assets or revenues from physical assets are involved in a smart contract or where revenues are received in one environment while those entitled to the revenues (and the smart contract)

operate in a different environment. The engine 28800 may perform covenant enforcement, where covenants may apply to multiple parties of an agreement, may monitor for compliance, may determine that there is a breach, and/or may determine that one or more breaches have been cured. Examples of cross-market environments that may involve disjointed data include involuntary collections, collateral repossession and disposition (e.g., mortgage foreclosures, auto repossessions, recoveries from sources not directly involved in the smart contract (e.g., deficiency balance collections), collections from co-applicants or guarantors or credit insurers, tax calculation, collection, and remittance, and the like.

In embodiments, the engine 28800 may facilitate enforcement in an environment where multiple parties contribute to creating a token or series of tokens, such as borrower and guarantor or co-applicants for a loan. Such environments may include cases where multiple parties pool their assets (or revenue streams) in a distributed environment in order to gain scale and efficiencies (lower pricing), such as lenders pooling resources. Further examples include transactions including credit insurance and other credit enhancement providers, such as guarantors and/or unrelated parties. The insurers, enhancement providers, guarantors, etc. may receive payment corresponding to risk.

In embodiments, such as those including structured finance environments, the engine 28800 may create a token or series of tokens based on an asset or asset pool. The token or series of tokens may be broken into credit tranches (e.g., AAA, AA, A . . . tokens) and marketed at different price points (and assume different risk levels) with the lower credit quality tokens dependent on the higher credit quality ones.

In embodiments, the engine 28800 may be configured to function as a trusted data steward, thereby ensuring secure transfer, use, and exchange of only necessary information between trusted parties. The engine 28800 may provide a data sharing platform employing one or more of blockchains, smart contracts, tokenization, double-blind methodology, and smart encryption. The smart encryption may be configured such that the data sharing platform or one or more users, clients, and/or parties may monitor service providers to ensure data is being used and stored appropriately, such as according to one or more contracts, smart contracts, laws, regulations, and/or the like. The data sharing platform may link to one or more financial institutions and/or other stakeholders and use data therefrom to effectively monitor service providers. The data sharing platform may secure data transmission approaches, such as 5G and IoT, employ one or more authentication models, facilitate exchange and consent management, and/or provide continuous authentication of parties (e.g., by using extended data sets).

In embodiments, the engine 28800 may perform data minimization with regard to the collection of personally identifiable information. The engine 28800 may use transaction history and related metadata, such as in a distributed ledger, to authenticate a person, entity or other transaction source (e.g., a virtual entity), thereby reducing the need for the solicitation, transmission, and/or storage of additional sensitive information. The engine 28800 may authenticate for a current transaction using information based on a prior transaction, such as information stored in a ledger. Devices associated with a transaction entity may be authenticated, at least in part, for a current transaction using information based on a prior transaction, such as information stored in a ledger.

In embodiments, the engine 28800 may facilitate one or more processes by which authentication may itself be a transaction recorded in a ledger. For example, the engine 28800 may justify a payment processor based on a prior authentication in collecting a reduced set of personally identifiable data for a current transaction.

In embodiments, a data purge may be a ledger transaction. For example, the engine 28800 may create an audit trail including data that an entity in a transaction chain had, but no longer stores, such as sensitive data that may be required to maintain in the ledger only for the purposes of processing a transaction. The engine 28800 may establish an audit trail for post-hoc verification that data collection was appropriate in scale and substance (e.g., only required and pertinent information was collected; unnecessary data was not stored, and the like).

In embodiments, the engine 28800 may use trusted data and/or data steward processes to rate entities that are would-be parties to a transaction. Entities may be at the device level, such that the rating may be a surrogate of how trusted or not trusted a device is based on its prior transaction/data collection record. The rating may be used as a selection criterion (including automated) for allowing participation of an entity, device and the like in a transaction, or to collect data, collect a particular type of data, and the like, for example to determine a reputation measurement derived from the blockchain or other transaction and data collection history.

In embodiments, the engine 28800 may use trusted data and/or data steward processes to determine potential transaction pathways available for a given transaction. For example, pathways may be determined for a transaction involving purchasing cryptocurrency using fiat currency from a banking institution and transferring the cryptocurrency to a personal wallet and to a vendor from the personal wallet to affect the transaction. The chain of transaction and/or data collection may be viewed as a single transaction for the purpose of rating the security, necessity of the contemplated data collection, and the like.

In embodiments, the engine 28800 may set a threshold that must be met in a rating to proceed with a contemplated transaction.

In embodiments, the engine 28800 may determine a measure of data collection behaviors, and/or may push behaviors, tracking mechanisms and the like.

In embodiments, the engine 28800 may include a verifiable action token module 28814 configured to create, manage, and/or facilitate the creation/management of verifiable action tokens. The verifiable action tokens may be tokens that are linked to data (e.g., operational, financial, etc.) and can be accessed securely to ensure agreed upon actions are taken. With the rise of alternative asset classes (e.g., crowdfunding, real estate), investments tied to verifiable actions provide investors additional transparency for their investment. Equity and/or debt tokens may be linked to real-time sources of data. The data sources may include, for example, IoT data, operational spending data, and resource allocation data. Actions may be taken based on verifiable triggers, such as regulatory, legal, financial, buying events, selling events, penalties, etc. In some embodiments, the verifiable action token module 28814 may facilitate management of custody, and/or trading, of verifiable tokens.

In embodiments, the engine 28800 may facilitate one or more processes by which the verifiable action token module 28814 is configured to implement verifiable action tokens with assets such as securities, investments, tangible assets, intangible assets, and value chain components. The verifiable action token module 28814 contains a GUI-enabled interface that allows an owner of a security, an investor, a party to an M&A and/or a contributor to or investor in a value chain to acquire, view, manage, and make transactions related to verifiable tokens for their assets. The owner may view their tokens and see which assets are related to the tokens. The owner may also view any smart contracts related to the tokens, and logs of past, current, and future actions taken according to such smart contracts. The actions may include related triggering events, which may also be displayed with related metrics. The metrics may be pulled from databases and real-time data sources. The databases and real-time data sources may include IoT sensor data, AI predictions and evaluations, operational spending metrics, resource allocations databases. A GUI interface may be provided for transferring custody of the verifiable tokens, such as via a marketplace and/or via private transactions. The tokens may have associated rewards and/or penalties, the rewards and/or penalties triggering automatically according to encoded triggering events, smart contracts, innate attributes, templates, etc. The verifiable action token module 28814 may include templates for types of securities (stock, bond, etc.), transactions (M&A, short, auction, etc.), assets (tangible, intangible, IP, inventory, security, etc.), and/or overseeing bodies (regulatory, insurance, etc.). The verifiable action token module 28814 may include a data stories system and related AI system configured to present the user with a human-readable data story in relatively plain language related to their verifiable tokens. The verifiable action token module 28814 may also include a marketplace integration system that allows the user to make transactions related to the tokens on one or more marketplace and/or auction platforms, or within one or more blockchains/distributed ledgers.

In embodiments, the engine 28800 may facilitate one or more processes by which the verifiable action token module 28814 may associate securities, such as stocks and bonds, with verifiable tokens recorded on a ledger. The recordation on the ledger may reduce the fees associated with the middlemen of a traditional securities exchange, as no middleman is required to maintain the integrity and value of the securities-associated tokens. The tokens may be signed, verifiable as unique and valid, and even have logic and/or smart contracts associated therewith. The logic and/or smart contracts may include automatically triggered events for transactions such as shorts. IPOs and other securities creation events may be managed via tokens and logic/smart contracts associated with the tokens.

In embodiments, the engine 28800 may facilitate one or more processes by which the verifiable action token module 28814 may facilitate backing investments of investors, such as private investors and VCs, by verifiable tokens. The verifiable tokens may be generated for businesses in which investors have invested, such as in assets of the business, or partial ownership of the business. Smart contracts and other logic may be employed with regard to the investment agreements. For example, an investor may receive an automatic payout upon verification of revenue, sale, license, etc. by the invested-in business.

In embodiments, the engine 28800 may facilitate one or more processes by which the verifiable action token module 28814 may manage merger and acquisition transactions via verifiable tokens recorded on a ledger. The tokens may be associated with assets of an entity to be acquired. The assets may include tangible assets such as inventory, equipment, infrastructure, etc. The assets may also or alternatively include intangible assets such as intellectual property, debts, securities, deeds, and liabilities such as contractual obligations, regulatory obligations, insurance obligations, etc. The verifiable action token module 28814 may associate smart contracts and/or logic the tokens to verify the integrity of each and facilitate transfer from one entity to another as the merger or acquisition transaction is completed.

In embodiments, the engine 28800 may facilitate one or more processes by which the verifiable action token module 28814 may tokenize manufacturing and/or value chain systems by verifiable tokens. The tokens may be associated with each of products produced, factory machines on a manufacturing floor, units of inventory in warehouses, or transport vehicles such as robots, trucks, trains, ships, etc. Different businesses that participate in a value chain may transfer verifiable tokens to one another via the verifiable action token module 28814 as resources are expended, materials and/or products are moved, contractual conditions are met, etc. AI systems of the platform 100 may be configured to automatically predict and/or validate conditions in manufacturing and/or value chain environments. The AI systems may tokenize predictions and validations. These tokens may be recorded, traded, and may even have value in secondary markets.

Examples of verifiable action tokens include green action tokens, production tokens, contract tokens, governance tokens, and energy tokens. The green tokens may include tokens to not cut down trees, tokens to not drive vehicles, tokens to use public transit, verified carbon capture tokens, verified non-pollution tokens, tokens for solar power usage, recycling tokens, weekly shipment/fewer packages delivered tokens, minimum plastic usage tokens, tokens for not dumping industrial effluent, and tokens for planting saplings and/or trees, and the like. Production tokens may include tokens for production of a product unit, tokens for mining of a mineral/metal, and the like. Contract tokens may include tokens for satisfaction of a payment obligation, tokens for satisfaction of a covenant, tokens for compliance with a permit's limitations, tokens for compliance with construction codes, and the like. Energy tokens may include tokens for energy usage within limits, tokens for saving energy, and the like. Further examples of tokens include guarantor action tokens, such as tokens for bearing risk and/or responsibility if a guaranteed action does not take place. Further examples of tokens include tokens verifying that one has not used bots and/or scripts to mass purchase/scalp a product having limited stock for the purpose of reselling on a secondary market, tokens verifying that one has not sold a product to more than one buyer 28806, tokens verifying that one has not sold to a prohibited buyer 28806 (such as a politically/statutorily prohibited foreign or criminal buyer 28806), tokens verifying that a politician or business executive has not taken money from illegal or unconscionable sources, tokens verifying that a politician has not illegally collaborated with a private business for marketing gain of the business or financial gain of the politician in exchange for political favors, and the like.

Further examples of verifiable action tokens include tokens for using an amount of electricity, tokens for air conditioner settings, tokens for heating settings, tokens for using an amount of water, tokens for length of shower, tokens for amounts of emissions, tokens for not eating meat, tokens for not slaughtering animals, tokens for plastic usage or non-usage, tokens for recycling, tokens for creating an amount of garbage, tokens for refraining from flying on planes and/or private jets, tokens for washing hands, tokens for wearing masks, tokens for being vaccinated, tokens for remaining at home and/or indoors, tokens for having fewer than an amount of people in a residence and/or on a premises, tokens for verifying crowdfunding projects and/or reaching landmarks thereof, tokens for attending school and/or classes, tokens for completing homework, tokens for performing community services, tokens for not smoking, tokens for not smoking in particular locations, public health tokens issues based on diet, speeding, not drinking, etc., tokens for managing consumption of clothing, potable fluids, foods, space, etc., tokens for mileage per week of transit, parental tokens based on spending time with children, reading with children, spending time outdoors with children, etc., philanthropic tokens based on performing charity work and/or contributions, tokens for taking medication, such as during a testing trial or while undergoing a therapy program, tokens for social media interaction, tokens for call center workers, tokens for calling a call center, tokens for making a sales contract, tokens for contacting customers and/or prospective customers, tokens for means of contact, e.g., voicemail, email, etc., tokens for meeting with persons, tokens for reducing disease spreading risk, tokens for potential interaction tracking, tokens for conditional probability of related actions, tokens for dispute resolution, tokens for proof of stake, tokens for insurance verification, tokens for cardiovascular activity, e.g., exercise classes, jogging habits, etc., tokens for servicing of warranties for cars, houses, rental properties, and the like, tokens for partaking in marketing activities, e.g., social media post interactions, tokens for employment conditions, tokens for college admissions criteria, tokens for community service work, tokens for law enforcement activities, tokens for maintenance of public spaces, and the like.

In embodiments, the engine 28800 may be configured to provide borderless asset enablement. Data is an asset and there are regulatory, compliance, security, cost and other reasons for data to remain in-house or not be moved outside of certain jurisdictions or locations. As the data economy grows with increased sharing of data, there needs to be a mechanism that allows data to be transacted and exchanged across borders, thereby becoming borderless. The engine 28800 may provide an asset-backed tokenization platform. The engine 28800 may provide connecting data owners with nodes to DLT networks via the asset-backed tokenization platform. The DLT networks are connected to other DLT networks via the asset-backed tokenization platform. As such, data is moved as a transaction on a DLT network as opposed to direct exchange. Architecture for borderless transactions may be one or more of proof-of-work, delegated proof-of-stake, bonded proof-of-stake, pure proof-of-stake, etc. In some embodiments, the asset-backed tokenization platform may provide decentralized financing of other non-traditional assets, e.g., balance sheets, knowledge, brand, workflows (crypto mining, verifications, oversight), and the like.

In embodiments, the engine 28800 may facilitate data to be transacted and exchanged across borders, including jurisdiction, industry, location, and the like. The engine 28800 may provide for a curated and/or regulated nested data pool with provenance that includes parts and assemblies, single and multiple users, etc., that can support transactions for analysis that support anonymous, personal, aggregated, fractional, specific, or other types of arrangements.

In embodiments, the engine 28800 may facilitate one or more processes by which borderless transactions may be provided according to one or more architectures, such as proof-of-work, delegated proof-of-stake, bonded proof-of-stake, pure proof-of-stake and/or any other suitable architecture.

In embodiments, the engine 28800 may facilitate decentralized financing of non-traditional assets, such as balance sheets, knowledge, brand, workflows (crypto mining, verifications, oversight, etc.).

In embodiments, the engine 28800 may facilitate protection of intellectual property.

In embodiments, the engine 28800 may be configured to perform one or more market-making enablement operations. Individual market participants or member firms of an exchange may buy and sell securities for their own accounts, at prices displayed in the exchange trading system, with the primary goal of profiting on a bid-ask spread (e.g., the amount by which the ask price exceeds the bid price of a market asset). Enabling detailed price data and price discovery to establish a fair price that satisfies both buyers 28806 and sellers 28808 with detailed data. The market-making enablement operations may include one or more of enabling fractional ownership, improving auction/trading mechanisms, and asset linking. Enabling fractional ownership may include, for example, moving from a bid process that enforces a winner-take-all outcome to fractional ownership, the fractional ownership process supporting buying and selling shares of illiquid assets. Improving auction/trading mechanisms may include, for example, facilitating trading of illiquid assets by providing connections to digitalized markets, enhancing trading of illiquid assets with emerging technology (e.g., AI, distributed ledgers, smart contracts, etc.), aggregating liquidity, and enabling new ecosystems. Asset linking may include, for example, establishing, managing, and/or facilitating strong information flows about physical and/or financial statuses of assets.

Examples of market makers include brokerage houses or traders that provide trading services for a marketplace with a goal of keeping financial markets liquid. Market makers may be or be enabled by artificial intelligence and/or intelligent agents. A market maker may be an individual trader, such as a cryptocurrency trader.

In embodiments, the engine 28800 may create liquidity in fragmented markets. For example, a market for trading future price of organic bean sprouts, and/or a market for trading future price of organic carrots. The engine 28800 may relate the prices of the organic bean sprouts and the organic carrots to one another, and generally related the prices of the sprouts and the carrots to the overall price of vegetables via one or more market-making operations.

In embodiments, the engine 28800 may facilitate cross-market transactions. For example, the engine 28800 may facilitate carbon trading (such as paying owners of trees not to cut them down), and/or encourage personal behavior (such as not to drive car or to only eat vegetables). The engine 28800 may also or alternatively allow one or more guarantors or insurers to bear costs of actions taken.

In embodiments, the engine 28800 may facilitate creation of liquidity in illiquid markets. For example, market makers may take large positions and hold them for longer periods of time to manage the liquidity of markets via one or more market-making operations. Further examples include the selling of super yachts or art, where there is a very limited market and buyers 28806 are very limited. In such markets, buyers 28806 and/or sellers 28808 may find themselves holding positions in large expensive vessels or pieces that are difficult to sell. The engine 28800 may facilitate sharing of fragmented ownership of the vessels or pieces, thereby creating liquidity in the market.

In embodiments, the engine 28800 may facilitate making of markets across time zones, such as within a group of cryptocurrency markets where the securities can move between time zones. For example, the engine 28800 may allow a market maker to move the token between markets in different time zones to manage liquidity and price stability.

In embodiments, the engine 28800 may facilitate the making of markets in markets having slow trading times. For example, in a housing marketplace a market maker may use the engine 28800 to buy and sell houses immediately, such as wherein a seller 28808 creates a position where there is a continuous availability of inventory and a potential for immediate resale of the property.

In embodiments, the engine 28800 may facilitate trading between market makers in fragmented markets. The market makers may collaborate via the engine 28800 tooling to ensure that the market makers are providing liquidity and are not driving the overall market position. For example, in a fragmented crypto marketplace with multiple securities, the market makers may collaborate on trades to manage liquidity via the engine 28800. The engine 28800 may then introduce liquidity as a commodity or metric that can be measured, and the value associated with these liquidity producing activities are valued by the market and can be communicated between market makers.

In embodiments, the engine 28800 may facilitate trading between AI-based market makers. AI-based market makers are increasingly becoming a central part of managing the marketplace and creating liquidity. AI engines can be subject to adversarial neural network attacks and other information attack mechanism to force loss making positions, rather than creating liquidity. For example, an AI agent may be responsible for management of liquidity in an extremely high fragmented marketplace for trading cards. The challenge is that trading cards have many types, and each has an associated value (e.g., individual cards may have a value of hundreds of thousands of dollars). The AI agents can access the quality of the card via the engine 28800 and establish liquidity in trading in part or whole of a card providing for verifiable trading events and reliability of trade.

In embodiments, the engine 28800 may enable market makers to find price in a highly distributed marketplace. Establishment of price in a highly distributed market may require creation of indices that span multiple markets and allow for management of rational (if markets can be rational) pricing levels. For example, the engine 28800 may facilitate analysis of market functions in indices. The indices may include multiple securities and a basket analysis of price of the securities. In a highly distributed marketplace, the indices may need to be vastly more complex providing for assessment market positions and variations. The engine 28800 allows the market maker to manage the indices and ensure that the indices are stable and price fluctuations are within reasonable market boundaries.

In embodiments, the engine 28800 facilitates community market makers and market making by consensus. Market making by consensus allows a social media based market maker to create community pools of resources across a social network, thereby creating liquidity in a broader market, thereby resulting in a decentralized set of arbitrage opportunities. For example, in a cryptocurrency marketplace, there is a potential for a group of individuals to collaborate to maintain liquidity in the marketplace. The collaboration may require each member to contribute capital to a trusted market maker that manages positions and shares gains (or losses).

In embodiments, the engine 28800 may facilitate market makers to manage reinsurance. Market makers may have reinsurance companies behind them while the market makers take market positions that enable the establishment of true liquidity while having risk levels managed by third parties. For example, a futures market in cryptocurrency tokens for pork bellies may have a high-risk exposure to future climate events. The reinsurance company can stand behind the high-risk exposure via the engine 28800, thereby providing for a price guarantee in the event of a climatic disaster impacting pork belly prices.

Cross markets are a natural and powerful way of market building a cohesive and real-world marketplace. By linking markets together, cross market operations create an environment where smaller marketplaces become viable and efficient. For example, a new home housing marketplace and a marketplace for plumbers may be linked via cross-market operations. The new housing creates demand for plumbers, and a trader may recognize and analyze the demand via the engine 28800. The trader may create cross market values for the localization of plumbing services that are associated with marketplaces for the construction of new home units.

Some common factors in the cross-market enablement include arbitrage and international market management. Traders may seek out arbitrage opportunities via the engine 28800, as the arbitrage opportunities often represent one of the best ways of building value. The engine 28800 may employ machine learning and/or AI/intelligent agents to identify opportunities for the trader to find and drive value through the act of buying and selling in both marketplaces. These actions drive liquidity in both marketplaces as traders drive volume and establish consistency of price. With assets that span nations, there is a potential for international marketplace activities. For example, the engine 28800 may identify and/or measure an amount of human resources required for a build of a new product. A marketplace that spans nations and is able to handle the complexities of currency exchange in the buying process can enable buyers 28806 to establish a price for goods that combines currency exchange considerations with the ability to deploy local resources via the cross-market operations. Further traders may seek arbitrage activities against the currency fluctuations. The international cross-market operations may include identifying and/or managing regulatory properties, roles for AI-based markets, globalization factors, time zone management, and liquidity across national markets.

In embodiments, the engine 28800 may facilitate investing and/or market-making in a human resources asset, such as in finding, managing, gaining, and/or allocating manpower for manufacturing, sales, service performance, and the like. The engine 28800 may perform cross-market operations such as improving auction/trading mechanisms, asset linking, performing human asset equalization, enabling investment in a person, and/or representing one or more human assets as intelligent agents and/or digital twins.

In embodiments, the engine 28800 may facilitate managing risk (with human or other assets) based on performance, such as via testimonials based on verifiable performance data and metrics. The testimonials may be created over time and/or augmented by risk insurers. The testimonials may be provided as a service to a range of newer platforms.

In embodiments, the engine 28800 may facilitate representing people as digital twins, investing in human capital, and assisting with managing human capital as part of an investment strategy.

In embodiments, the engine 28800 may facilitate development of human capital, such as by gathering data related to and quantifying and/or qualifying impacts of education and/or experience human capital. For example, the engine 28800 may gather data relating and quantify and/or qualify the impacts of different skills sets on risk and insurance mitigation. If a team is lacking skill in regulatory governance, the 28800 may identify whether there is a real risk to regulatory initiatives. By way of further example, if there is a skills shortage, the engine 28800 may identify projects that could provide training experience to allow for human capital development.

In embodiments, the engine 28800 may be configured to perform order matching via an order matching system. The order matching system is an electronic system that matches buy and sell orders for a stock market, commodity market or other financial exchange. When market making, the way in which order matching operates can be crucial to how firms market match.

In embodiments, the engine 28800 may facilitate matching orders by considering price, timing, and/or quantity of goods and/or services. The engine 28800 may employ traditional matching, price-time-priority, and/or pro-rata priority systems, and/or any other suitable priority system for matching orders. Traditional matching may prioritize volume, benefiting buyers 28806 (bidders) and sellers 28808 (askers). Price-time-priority may match an earliest bid at a highest price before any similar bids at the same price that entered after, such as via a FIFO system. Pro-rata priority may match equivalently priced bids to a matching ask proportional to an amount of active bids.

In embodiments, the engine 28800 may facilitate order matching for transactions involving a plurality of blockchains and/or distributed ledgers. A smart contract may be stored on a single chain and/or ledger. As such, cross-chain or buy-into/selling-out-of actions may often require interacting with multiple blockchains.

In embodiments, the engine 28800 may facilitate creations and/or management of a parent contract that launches on several blockchains and/or ledgers, thereby allowing for transacting between the blockchains and/or ledgers. Each blockchain and/or ledger may require an exchange ratio, and/or may exist on a stand-alone chain that can host parent contracts. Buying-into/selling-out-of transactions may occur with stablecoins.

In some embodiments, the engine 28800 may facilitate one or more processes by which the order matching system may operate using a time priority. The principle of price/time priority refers to how orders are prioritized for execution. Orders are first ranked according to their price; orders of the same price are then ranked depending on when they were entered. Network based time speed priority allows for leveling playing field, e.g., via clock synchronization across parties.

In some embodiments, the engine 28800 may facilitate one or more processes by which the order matching system may operate using a parity priority. The parity priority rewards those who set the best price, then allocates the remaining shares to other orders that match that price. By sharing the allocation among those who post the best price, rather than based on how quickly they place the order, institutional investors benefit from better fill rates, execution costs, and the ability to share executions at the same price as faster participants.

In embodiments, the engine 28800 may include a or interface with a robotic process automation (RPA) module configured to perform high-frequency, repeatable tasks that would otherwise be performed by a human. The RPA module may operate by consistently applying rules and adherence to control frameworks, thereby reducing processing time of the tasks.

In embodiments, the engine 28800 may include an intelligent agent module configured to create, configure, and manage one or more intelligent agents. The intelligent agents may make decisions and/or perform one or more services based on an environment, user input, and experiences. The intelligent agents can autonomously gather information (e.g., on a regular, programmed schedule or upon being prompted by a user). Examples of tasks that the engine 28800 may perform via one or more intelligent agents include automating interactive and sophisticated processes, performing front office business operations, performing intelligent, contextual, updated client outreach, performing communication via email, text, other messaging platforms, performing negotiation, performing RPA assisted negotiation, provide negotiation terms and alternatives, performing full negotiation based on a gaming/logic engine, performing social media interaction, responding to client comments on social media, "liking" or otherwise interacting with relevant social media posts, performing content reposting and/or generation, improving end-user experience, monitoring and/or shadowing human-human exchanges, perform actions based human-human exchanges, preparing packages, accounts and/or loans for opening, delivering and/or interacting with off-channel content and/or services, automating accounting for transactions, automating execution, providing analytics that create sophisticated and accurate frameworks, automating pricing of cross-market products based on comparable prices for direct services from competitors, execution of contract terms, etc. For example, the engine 28800 may employ an intelligent agent to perform mortgage cross-selling enhanced by IoT data and AI. The intelligent agent may perform enterprise churn prediction and determine preventative negotiated rates to minimize customer loss. By way of another example, in a healthcare environment including regulations, insurance, and/or finance management, the engine 28800 may employ an intelligent agent to assist with determining and analyzing a choice of banks, bank accounts, and bank features, facilitate regulatory hand-offs and self-validation. The intelligent agent may assist a service provider with a portal for deposits, withdrawals, and/or compliance reporting. The intelligent agent may merge health insurance claim streams with bank account activity data and user actions. The intelligent agent may facilitate creation and management of a health portal for a health insurance provider. The health portal may contain highly confidential information which may be managed via blockchain and/or distributed ledger. The intelligent agent may assist with bill payment services, such as by handling direct payments and/or automatic payments for approved claims. The intelligent agent may assist with add-on financial and/or investments services, such as HSA spending management. The intelligent agent may be configured to create and/or manage a smart wallet. The smart wallet may be configured to manage one or more actions related to a regulated HAS, such as policy and governance of data presentation, validation without invading privacy, and/or payments for health services.

In embodiments, the engine 28800 may facilitate one or more processes by which the RPA module, coupled with intelligent agents, can automate interactive and sophisticated processes, as well as perform front-office business operations. As such, the RPA module can operate with high-intensity workloads that seamlessly integrate for improved end-user experience. The intelligent agents can work in synergy with other digital and automation technologies, such as IoT (Internet of Things), and analytics, to create sophisticated and accurate frameworks. For example, the engine 28800 may enable mortgage cross-selling enhanced by IoT data and AI via the RPA module and the intelligent agent module. Thereby the engine 28800 may perform enterprise churn prediction and predict preventative negotiated rates to minimize customer loss.

In embodiments, the engine 28800 may be configured to, via one or both of the RPA module and the one or more intelligent agents, dynamically optimize market conditions, such as prices, liquidity, availability, etc. of traded assets and/or currencies (cryptocurrencies, fiat currencies) based on real-time intelligence. For example, on the lending side, cost of acquisition of customers and type of loan and quality of underwriting (e.g., filters to the incoming funnel) can be adjusted based on current market conditions of those in the funnel (e.g., data from the funnel). Moreover, the need to discount the sale of servicing can be tied to the acquisition.

In embodiments, the engine 28800 may be configured to perform gamification of internal burn rate. The engine 28800 may cross-reference internal burn rate with third-party bandwidth, such as bandwidth of a title company, and provide incentives to move a closing to accommodate needs.

In embodiments, the engine 28800 may perform or facilitate adjustment of underlying insurance contracts to ensure beneficiaries of policy are made whole upon default of the asset owner.

In embodiments, the engine 28800 may be configured to create, manage, and/or facilitate transactions for NFT-based titles of real estate. The engine 28800 may facilitate crowdsourcing the confidence in tracing title, and, in embodiments, may build a token based on crowdsourced information, especially where underlying records are gone.

Market Prediction System

Referring to FIG. 290, the present disclosure relates to a market prediction system platform 29000 that is configured to generate market predictions (e.g., a prediction about a set of markets, a prediction about market share, a prediction about a set of marketplaces, a prediction about a set of assets, a prediction about the pricing of a set of assets, a prediction about a set of transactions, a prediction about a parameter of demand, a prediction about a parameter of supply, a prediction about a set of contracts, a prediction about a set of smart contracts, a prediction about the terms or conditions of a smart contract, a prediction about a party in a market, and many others), referred to herein in the alternative as the "platform," the "system" or the like, with such terms comprising various alternative embodiments involving various sets of components, modules, systems, sub-systems, processes, services, methods, and other elements described herein and in the documents incorporated herein by reference.

According to embodiments herein, a market or a marketplace may refer to an environment configured to facilitate transactions related to a set of assets. Assets may refer to commodities, physical assets, products, digital assets, services, stocks, bonds, marketplace-traded funds (ETF), mutual funds, currencies, foreign exchange (FX), artwork and other works of authorship, alternative assets, recycled plastics, digital 3D designs, digital gaming assets, virtual goods, real estate, placement rights (such as for advertising), cryptocurrencies, metals and alloys, energy resources, derivatives (such as futures, forwards, options, puts, calls, and swaps), 3D printing capacity, digital twins, storage, intellectual property (e.g., trade secrets, patents, trademarks, designs, know how, privacy rights, publicity rights, and others), instruction sets, hybrid instruments, synthetic instruments, tranches of assets (including similar and mixed-asset tranches), streams of value (such as of interest), certificates of deposit (CDs), and the like, as well as portions of the above (such as divisible and undivided interests), hybrids of the above, and aggregates of the above (including tranches of securities, mutual funds, index funds, and others).

In some embodiments, a marketplace may be a forward marketplace. In embodiments, a forward marketplace may refer to an electronic marketplace that provides a medium for counterparties to negotiate and engage in forward contracts. A forward contract may refer to a customized contract between two parties to buy/sell a negotiated quantity of an asset at a negotiated price on a negotiated date. Examples of assets that may be sold using forward contracts include agricultural commodities (e.g., wheat, corn, oranges, cotton, and/or the like), natural resources (e.g., natural gas, oil, gold, silver, platinum, or the like), financial instruments (e.g., stocks, bonds, currencies, or the like), non-traditional assets and/or other suitable commodities (e.g., fuel, electricity, energy, computational resources (e.g., quantum computational resources), storage capacity, network capacity, network spectrum, advertising, attention resources, cryptocurrencies, defined income streams, data streams (such as sensor data, network data and the like), knowledge structures, and many others.

In embodiments, the market prediction system may be configured to predict a parameter of demand for a set of assets. In embodiments, the parameter of demand may be a transaction parameter, a price, a total contract value, a profit margin value, a timing parameter, and many others.

In embodiments, the platform 29000 includes an API system that facilitates the transfer of data between a set of external systems and the platform 29000. In some embodiments, the platform 29000 includes databases that store data relating to markets, marketplaces, transactions, contracts (e.g., smart contracts), assets, predictions, and the like.

In embodiments, the platform 29000 includes and/or integrates with an intelligence services system (also referred to as "intelligence services"), described throughout this document and by documents referenced herein. In embodiments, the intelligence services system provides a framework for providing intelligence services to the market prediction system platform 29000. In some embodiments, the intelligence services framework may be adapted to be at least partially replicated in the market prediction system platform 29000. In these embodiments, the market prediction system platform 29000 may include some or all of the capabilities of the intelligence services, whereby the intelligence services is adapted for the specific functions performed by the subsystems of the intelligence client. Additionally or alternatively, in some embodiments, the intelligence services may be implemented as a set of microservices, such that the market prediction system platform 29000 may leverage the intelligence services via one or more APIs exposed to the platform 29000. In embodiments, the market prediction system platform 29000 may provide an intelligence request to the intelligence services, whereby the request is to perform a specific intelligence task (e.g., a prediction). In some embodiments, the market prediction system platform 29000 may request non-prediction intelligence tasks, including decisions, recommendations, reports, control instructions, classifications, training actions, NLP requests, digital twin requests, RPA requests, or the like. In response, the intelligence services executes the requested intelligence task and returns a response to the market prediction system platform 29000. Additionally or alternatively, in some embodiments, the intelligence services may be implemented using one or more specialized chips that are configured to provide AI assisted microservices such as image processing, diagnostics, location and orientation, chemical analysis, data processing, and so forth.

In embodiments, the platform 29000 includes and/or integrates with a quantum computing system (also referred to as "quantum services"), described throughout this document and by documents referenced herein. In embodiments, the quantum computing system provides a framework for providing a set of quantum computing services to the market prediction system platform 29000. In some embodiments, the quantum computing system framework may be at least partially replicated in the market prediction system platform 29000. In these embodiments, the market prediction system platform 29000 may include some or all of the capabilities of the quantum computing system, whereby the quantum computing system is adapted for the specific functions performed by the subsystems of the quantum computing client. Additionally, or alternatively, in some embodiments, the quantum computing system may be implemented as a set of microservices, such that the market prediction system platform 29000 may leverage the quantum computing system via one or more APIs exposed to the platform 29000. In these embodiments, the quantum computing system may be configured to perform various types of quantum computing services that may be adapted for different quantum computing clients. In either of these configurations, a quantum computing client may provide a request to the quantum computing system, whereby the request is to perform a specific quantum computing task (e.g., a quantum prediction). In response, the quantum computing system executes the requested task and returns a response to the quantum computing client.

In embodiments, a market prediction system platform 29000 is provided having a crowdsourcing system for obtaining information that may be relevant to generating market predictions (e.g., a prediction about a set of markets, a prediction about market share, a prediction about a set of marketplaces, a prediction about a set of assets, a prediction about the pricing of a set of assets, a prediction about a set of transactions, a prediction about a parameter of demand, a prediction about a parameter of supply, a prediction about a set of contracts, a prediction about a set of smart contracts, a prediction about the terms or conditions of a smart contract, a prediction about a party in a market, and many others), including information related to product availability, product pricing, delivery timing, need for refill, need for replacement, manufacturer recall, need for upgrade, need for maintenance, need for update, need for repair, need for consumable, taste, preference, inferred need, inferred want, group demand, individual demand, family demand, business demand, need for workflow, need for process, need for procedure, need for treatment, need for improvement, need for diagnosis, compatibility to system, compatibility to product, compatibility to style, compatibility to brand, demographic, psychographic, geolocation, indoor location, destination, route, home location, visit location, workplace location, business location, personality, mood, emotion, customer behavior, business type, business activity, personal activity, wealth, income, purchasing history, shopping history, search history, engagement history, clickstream history, website history, online navigation history, group behavior, family behavior, family membership, customer identity, group identity, business identity, customer profile, business profile, group profile, family profile, declared interest, inferred interest factors, component availability, material availability, component location, material location, component pricing, material pricing, taxation, tariff, impost, duty, import regulation, export regulation, border control, trade regulation, customs, navigation, traffic, congestion, vehicle capacity, ship capacity, container capacity, package capacity, vehicle availability, ship availability, container availability, package availability, vehicle location, ship location, container location, port location, port availability, port capacity, storage availability, storage capacity, warehouse availability, warehouse capacity, fulfillment center location, fulfillment center availability, fulfillment center capacity, asset owner identity, system compatibility, worker availability, worker competency, worker location, goods pricing, fuel pricing, energy pricing, route availability, route distance, route cost, route safety, and many others.

A blockchain, such as optionally embodying a distributed ledger, may be configured with a set of smart contracts to administer a reward for the submission of information. In embodiments, a blockchain, such as optionally distributed in a distributed ledger, may be used to configure a request for information along with terms and conditions related to the information, such as a reward for submission of the information, a set of terms and conditions related to the use of the information), and various parameters, such as timing parameters, the nature of the information required (such as independently validated information like video footage, photographs, witnessed statements, or the like), and other parameters.

In embodiments, the market prediction system collects data from a set of Internet of Things systems that collect information about a set of entities in a set of environments. In embodiments, the Internet of Things systems may include smart home Internet of Things devices, workplace Internet of Things devices, Internet of Things devices to monitor a set of consumer goods stores, and many others, including any of the Internet of Things devices described throughout this document and the documents incorporated by reference herein. In embodiments, the Internet of Things systems may be configured to collect information (e.g., behavioral information) about a set of entities in a set of environments.

In embodiments, the entities may include products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, port infrastructure facilities, and many others.

In embodiments, the environments may include the home of a consumer, retail facilities, manufacturing facilities, supply chain facilities, ship containers, ship, boat, barge, maritime port, crane, container, container handling facilities, shipyard, maritime dock, warehouse, distribution facilities, fulfillment facilities, fueling facilities, refueling facilities, nuclear refueling facilities, waste removal facilities, food supply facilities, beverage supply facilities, drone facilities, robot facilities, autonomous vehicle, aircraft, automotive, truck, train, lift, forklift, hauling facilities, conveyor, loading dock, waterway, bridge, tunnel, airport, depot, vehicle station, train station, weigh station, inspection station or point, roadway, railway, highway, customs house, border control facilities, and many others.

In embodiments, the market prediction system platform 29000 leverages the intelligence services system to generate a prediction (e.g., a prediction about a set of markets, a prediction about market share, a prediction about a set of marketplaces, a prediction about a set of assets, a prediction about the pricing of a set of assets, a prediction about a set of transactions, a prediction about a parameter of demand, a prediction about a parameter of supply, a prediction about a set of contracts, a prediction about a set of smart contracts, a prediction about the terms or conditions of a smart contract, a prediction about a party in a market, and many others). In these embodiments, the predictions may be based on many different sources of data, including crowdsourced data, data collected from IoT systems, simulation data (e.g., such as from simulations performed by digital twins), external data (e.g., social media data, news data, and the like), and many others. In embodiments, the market prediction system platform 29000 leverages the intelligence services system for non-prediction intelligence tasks.

In examples, a set of machine-learned models may be used to predict the price of an asset at some future point in time. In embodiments, a “set” of machine-learned models may include a set with one member. In embodiments, a “set” of machine-learned models may include a set with multiple members. In embodiments, a “set” of machine-learned models may include hybrids of different types of models (e.g., hybrids of RNN and CNN). In this example, the intelligent services may receive a request to generate a prediction and asset data, historical pricing data, discussion board data, and news data from the market prediction system platform 29000 and may generate a set of feature vectors based on the received data. The intelligent services system may input the feature vector into the set of machine-learned models trained specifically for the asset (e.g., using a combination of simulation data and real-world data) to generate a prediction of the price of the asset at the future point in time and return the prediction to the market prediction system platform 29000. In embodiments, the feature vector may include a set of predictions, such as ones made by human experts, by other systems, and/or by other models. Such artificial intelligence systems used for prediction (in this example and other examples described throughout this disclosure) may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to predict a parameter of demand for an asset in a forward marketplace using crowdsourced data. In this example, the intelligent services may receive asset data, historical pricing data, and data collected by the crowdsourcing system from the market prediction system platform 29000 and may generate a set of feature vectors based on the received data. The intelligent services system may input the feature vector into the set of machine-learned models trained specifically for the asset (e.g., using a combination of simulation data and real-world data) to predict a parameter of demand related to that asset and return that prediction to the market prediction system platform 29000. In embodiments, the feature vector may include a set of predictions, such as ones made by human experts, by other systems, and/or by other models. Such artificial intelligence systems used for prediction (in this example and other examples described throughout this disclosure) may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to predict a parameter of demand for an asset in a forward marketplace using data collected by a set of Internet of Things systems collecting information from a set of entities in a set of environments. In this example, the intelligent services may receive asset data, news data, and data collected by the set of Internet of Things systems from the market prediction system platform 29000 and may generate a set of feature vectors based on the received data. The intelligent services system may input the feature vector into the set of machine-learned models trained specifically for the asset (e.g., using a combination of simulation data and real-world data) to predict a parameter of demand related to that asset and return the prediction to the market prediction system platform 29000. In embodiments, the feature vector may include a set of predictions, such as ones made by human experts, by other systems, and/or by other models. Such artificial intelligence systems used for prediction (in this example and other examples described throughout this disclosure) may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In examples, a set of machine-learned models may be used to predict the terms and/or conditions of a smart contract for a transaction related to a set of assets. In this example, the intelligent services may receive public smart contract data, data collected by the crowdsourcing system, and data collected from a set of Internet of Things systems about a set of entities in a set of environments from the market prediction system platform 29000 and may generate a set of feature vectors based on the received data. The intelligent services system may input the feature vector into the set of machine-learned models trained specifically for the smart contracts related to that set of assets (e.g., using a combination of simulation data and real-world data) to predict the terms and/or conditions of a smart contract related to a transaction for that set of assets and return the prediction to the market prediction system platform 29000. In embodiments, the feature vector may include a set of predictions, such as ones made by human experts, by other systems, and/or by other models. Such artificial intelligence systems used for prediction (in this example and other examples described throughout this disclosure) may include a recurrent neural network (including a gated recurrent neural network), a convolutional neural network, a combination of a recurrent neural network and a convolutional neural network, or other types of neural network or combination or hybrid of types of neural network described herein or in the documents incorporated by reference herein.

In embodiments, the market prediction system platform 29000 leverages the quantum computing system to generate a quantum prediction (e.g., a prediction about a set of markets, a prediction about market share, a prediction about a set of marketplaces, a prediction about a set of assets, a prediction about the pricing of a set of assets, a prediction about a set of transactions, a prediction about a parameter of demand, a prediction about a parameter of supply, a prediction about a set of contracts, a prediction about a set of smart contracts, a prediction about the terms or conditions of a smart contract, a prediction about a party in a market, and many others). In these embodiments, the predictions may be based on many different sources of data, including crowd-sourced data, data collected from IoT systems, external data (e.g., social media data, news data, and the like), and many others. In embodiments, the market prediction system platform 29000 leverages the quantum computing system for non-prediction quantum computing tasks. In either of these configurations, a quantum computing client may provide a request to the quantum computing system, whereby the request is to perform a specific quantum computing task. In response, the quantum computing system executes the requested task and returns a response to the quantum computing client.

Quantum Computing Systems

FIG. 291 illustrates an example quantum computing system 29100 according to some embodiments of the present disclosure. In embodiments, the quantum computing system 29100 provides a framework for providing a set of quantum computing services to one or more quantum computing clients. In some embodiments, the quantum computing system 29100 framework may be at least partially replicated in respective quantum computing clients. In these embodiments, an individual client may include some or all of the capabilities of the quantum computing system 29100, whereby the quantum computing system 29100 is adapted for the specific functions performed by the subsystems of the quantum computing client. Additionally, or alternatively, in some embodiments, the quantum computing system 29100 may be implemented as a set of microservices, such that different quantum computing clients may leverage the quantum computing system 29100 via one or more APIs exposed to the quantum computing clients. In these embodiments, the quantum computing system 29100 may be configured to perform various types of quantum computing services that may be adapted for different quantum computing clients. In either of these configurations, a quantum computing client may provide a request to the quantum computing system 29100, whereby the request is to perform a specific task (e.g., an optimization). In response, the quantum computing system 29100 executes the requested task and returns a response to the quantum computing client.

Referring to FIG. 291, in some embodiments, the quantum computing system 29100 may include a quantum adapted services library 29102, a quantum general services library 29104, a quantum data services library 29106, a quantum computing engine library 29108, a quantum computing configuration service 29110, a quantum computing execution system 29112, and quantum computing API interface 29114.

In embodiments, the quantum computing engine library 29108 includes quantum computing engine configurations 29116 and quantum computing process modules 29118 based on various supported quantum models. In embodiments, the quantum computing system 29100 may support many different quantum models, including, but not limited to, the quantum circuit model, quantum Turing machine, adiabatic quantum computer, spintronic computing system (such as using spin-orbit coupling to generate spin-polarized electronic states in non-magnetic solids, such as ones using diamond materials), one-way quantum computer, quantum annealing, and various quantum cellular automata. Under the quantum circuit model, quantum circuits may be based on the quantum bit, or "qubit", which is somewhat analogous to the bit in classical computation. Qubits may be in a 1 or 0 quantum state or they may be in a superposition of the 1 and 0 states. However, when qubits have measured the result of a measurement, qubits will always be in is always either a 1 or 0 quantum state. The probabilities related to these two outcomes depend on the quantum state that the qubits were in immediately before the measurement. Computation is performed by manipulating qubits with quantum logic gates, which are somewhat analogous to classical logic gates.

In embodiments, the quantum computing system 29100 may be physically implemented using an analog approach or a digital approach. Analog approaches may include, but are not limited to, quantum simulation, quantum annealing, and adiabatic quantum computation. In embodiments, digital quantum computers use quantum logic gates for computation. Both analog and digital approaches may use quantum bits, or qubits.

In embodiments, the quantum computing system 29100 includes a quantum annealing module 29120 wherein the quantum annealing module may be configured to find the global minimum or maximum of a given objective function over a given set of candidate solutions (e.g., candidate states) using quantum fluctuations. As used herein, quantum annealing may refer to a meta-procedure for finding a procedure that identifies an absolute minimum or maximum, such as a size, length, cost, time, distance or other measure, from within a possibly very large, but finite, set of possible solutions using quantum fluctuation-based computation instead of classical computation. The quantum annealing module 29120 may be leveraged for problems where the search space is discrete (e.g., combinatorial optimization problems) with many local minima, such as finding the ground state of a spin glass or the traveling salesman problem.

In embodiments, the quantum annealing module 29120 starts from a quantum-mechanical superposition of all possible states (candidate states) with equal weights. The quantum annealing module 29120 may then evolve, such as following the time-dependent Schrödinger equation, a natural quantum-mechanical evolution of systems (e.g., physical systems, logical systems, or the like). In embodiments, the amplitudes of all candidate states change, realizing quantum parallelism according to the time-dependent strength of the transverse field, which causes quantum tunneling between states. If the rate of change of the transverse field is slow enough, the quantum annealing module 29120 may stay close to the ground state of the instantaneous Hamiltonian. If the rate of change of the transverse field is accelerated, the quantum annealing module 29120 may leave the ground state temporarily but produce a higher likelihood of concluding in the ground state of the final problem energy state or Hamiltonian.

In embodiments, the quantum computing system 29100 may include arbitrarily large numbers of qubits and may transport ions to spatially distinct locations in an array of ion traps, building large, entangled states via photonically connected networks of remotely entangled ion chains.

In some implementations, the quantum computing system 29100 includes a trapped ion computer module 29122, which may be a quantum computer that applies trapped ions to solve complex problems. Trapped ion computer module 29122 may have low quantum decoherence and may be able to construct large solution states. Ions, or charged atomic particles, may be confined and suspended in free space using electromagnetic fields. Qubits are stored in stable electronic states of each ion, and quantum information may be transferred through the collective quantized motion of the ions in a shared trap (interacting through the Coulomb force). Lasers may be applied to induce coupling between the qubit states (for single-qubit operations) or coupling between the internal qubit states and the external motional states (for entanglement between qubits).

In some embodiments of the invention, a traditional computer, including a processor, memory, and a graphical user interface (GUI), may be used for designing, compiling, and providing output from the execution and the quantum computing system 29100 may be used for executing the machine language instructions. In some embodiments of the invention, the quantum computing system 29100 may be simulated by a computer program executed by the traditional computer. In such embodiments, a superposition of states of the quantum computing system 29100 can be prepared based on input from the initial conditions. Since the initialization operation available in a quantum computer can only initialize a qubit to either the |0> or |1> state, initialization to a superposition of states is physically unrealistic. For simulation purposes, however, it may be useful to bypass the initialization process and initialize the quantum computing service QNTM1114 directly.

In some embodiments, the quantum computing system 29100 provides various quantum data services, including quantum input filtering, quantum output filtering, quantum application filtering, and a quantum database engine.

In embodiments, the quantum computing system 29100 may include a quantum input filtering service 29124. In embodiments, quantum input filtering service 29124 may be configured to select whether to run a model on the quantum computing system 29100 or to run the model on a classic computing system. In some embodiments, quantum input filtering service 29124 may filter data for later modeling on a classic computer. In embodiments, the quantum computing system 29100 may provide input to traditional compute platforms while filtering out unnecessary information from flowing into distributed systems. In some embodiments, the platform 29100 may trust through filtered specified experiences for intelligent agents.

In embodiments, a system in the system of systems may include a model or system for automatically determining, based on a set of inputs, whether to deploy quantum computational or quantum algorithmic resources to an activity, whether to deploy traditional computational resources and algorithms, or whether to apply a hybrid or combination of them. In embodiments, inputs to a model or automation system may include demand information, supply information, financial data, energy cost information, capital costs for computational resources, development costs (such as for algorithms), energy costs, operational costs (including labor and other costs), performance information on available resources (quantum and traditional), and any of the many other data sets that may be used to simulate (such as using any of a wide variety of simulation techniques described herein and/or in the documents incorporated herein by reference) and/or predict the difference in outcome between a quantum-optimized result and a non-quantum-optimized result. A machine learned model (including in a DPANN system) may be trained, such as by deep learning on outcomes or by a data set from human expert decisions, to determine what set of resources to deploy given the input data for a given request. The model may itself be deployed on quantum computational resources and/or may use quantum algorithms, such as quantum annealing, to determine whether, where and when to use quantum systems, conventional systems, and/or hybrids or combinations.

In some embodiments of the invention, the quantum computing system 29100 may include a quantum output filtering service 29126. In embodiments, the quantum output filtering service 29126 may be configured to select a solution from solutions of multiple neural networks. For example, multiple neural networks may be configured to generate solutions to a specific problem and the quantum output filtering service 29126 may select the best solution from the set of solutions.

In some embodiments, the quantum computing system 29100 connects and directs a neural network development or selection process. In this embodiment, the quantum computing system 29100 may directly program the weights of a neural network such that the neural network gives the desired outputs. This quantum-programmed neural network may then operate without the oversight of the quantum computing system 29100 but will still be operating within the expected parameters of the desired computational engine.

In embodiments, the quantum computing system 29100 includes a quantum database engine 29128. In embodiments, the quantum database engine 29128 is configured with in-database quantum algorithm execution. In embodiments, a quantum query language may be employed to query the quantum database engine 29128. In some embodiments, the quantum database engine may have an embedded policy engine 29130 for prioritization and/or allocation of quantum workflows, including prioritization of query workloads, such as based on overall priority as well as the comparative advantage of using quantum computing resources versus others. In embodiments, quantum database engine 29128 may assist with the recognition of entities by establishing a single identity for that is valid across interactions and touchpoints. The quantum database engine 29128 may be configured to perform optimization of data matching and intelligent traditional compute optimization to match individual data elements. The quantum computing system 29100 may include a quantum data obfuscation system for obfuscating data.

The quantum computing system 29100 may include, but is not limited to, analog quantum computers, digital computers, and/or error-corrected quantum computers. Analog quantum computers may directly manipulate the interactions between qubits without breaking these actions into primitive gate operations. In embodiments, quantum computers that may run analog machines include, but are not limited to, quantum annealers, adiabatic quantum computers, and direct quantum simulators. The digital computers may operate by carrying out an algorithm of interest using primitive gate operations on physical qubits. Error-corrected quantum computers may refer to a version of gate-based quantum computers made more robust through the deployment of quantum error correction (QEC), which enables noisy physical qubits to emulate stable logical qubits so that the computer behaves reliably for any computation. Further, quantum information products may include, but are not limited to, computing power, quantum predictions, and quantum inventions.

In some embodiments, the quantum computing system 29100 is configured as an engine that may be used to optimize traditional computers, integrate data from multiple sources into a decision-making process, and the like. The data integration process may involve real-time capture and management of interaction data by a wide range of tracking capabilities. In embodiments, the quantum computing system 29100 may be configured to accept cookies, email addresses and other contact data, social media feeds, news feeds, event and transaction log data (including transaction events, network events, computational events, and many others), event streams, results of web crawling, distributed ledger information (including blockchain updates and state information), results from distributed or federated queries of data sources, streams of data from chat rooms and discussion forums, and many others.

In embodiments, the quantum computing system 29100 includes a quantum register having a plurality of qubits. Further, the quantum computing system 29100 may include a quantum control system for implementing the fundamental operations on each of the qubits in the quantum register and a control processor for coordinating the operations required.

In embodiments, the quantum computing system 29100 is configured to optimize the pricing of a set of goods or services. In embodiments, the quantum computing system 29100 may utilize quantum annealing to provide optimized pricing. In embodiments, the quantum computing system 29100 may use q-bit based computational methods to optimize pricing.

In embodiments, the quantum computing system 29100 is configured to automatically discover smart contract configuration opportunities. Automated discovery of smart contract configuration opportunities may be based on published APIs to marketplaces and machine learning (e.g., by robotic process automation (RPA) of stakeholder, asset, and transaction types.

In embodiments, quantum-established or other blockchain-enabled smart contracts enable frequent transactions occurring among a network of parties, and manual or duplicative tasks are performed by counterparties for each transaction. The quantum-established or other blockchain acts as a shared database to provide a secure, single source of truth, and smart contracts automate approvals, calculations, and other transacting activities that are prone to lag and error. Smart contracts may use software code to automate tasks, and in some embodiments, this software code may include quantum code that enables extremely sophisticated optimized results.

In embodiments, the quantum computing system 29100 or other system in the system of systems may include a quantum-enabled or other risk identification module that is configured to perform risk identification and/or mitigation. The steps that may be taken by the risk identification module may include, but are not limited to, risk identification, impact assessment, and the like. In some embodiments, the risk identification module determines a risk type from a set of risk types. In embodiments, risks may include, but are not limited to, preventable, strategic, and external risks. Preventable risks may refer to risks that come from within and that can usually be managed on a rule-based level, such as employing operational procedures monitoring and employee and manager guidance and instruction. Strategy risks may refer to those risks that are taken on voluntarily to achieve greater rewards. External risks may refer to those risks that originate outside and are not in the businesses' control (such as natural disasters). External risks are not preventable or desirable. In embodiments, the risk identification module can determine a predicted cost for many categories of risk. The risk identification module may perform a calculation of current and potential impact on an overall risk profile. In embodiments, the risk identification module may determine the probability and significance of certain events. Additionally, or alternatively, the risk identification module may be configured to anticipate events.

In embodiments, the quantum computing system 29100 or other system of the platform 29100 is configured for graph clustering analysis for anomaly and fraud detection.

In some embodiments, the quantum computing system 29100 includes a quantum prediction module, which is configured to generate predictions. Furthermore, the quantum prediction module may construct classical prediction engines to further generate predictions, reducing the need for ongoing quantum calculation costs, which, can be substantial compared to traditional computers.

In embodiments, the quantum computing system 29100 may include a quantum principal component analysis (QPCA) algorithm that may process input vector data if the covariance matrix of the data is efficiently obtainable as a density matrix, under specific assumptions about the vectors given in the quantum mechanical form. It may be assumed that the user has quantum access to the training vector data in a quantum memory. Further, it may be assumed that each training vector is stored in the quantum memory in terms of its difference from the class means. These QPCA algorithms can then be applied to provide for dimension reduction using the calculational benefits of a quantum method.

In embodiments, the quantum computing system 29100 is configured for graph clustering analysis for certified randomness for proof-of-stake blockchains. Quantum cryptographic schemes may make use of quantum mechanics in their designs, which enables such schemes to rely on presumably unbreakable laws of physics for their security. The quantum cryptography schemes may be information-theoretically secure such that their security is not based on any non-fundamental assumptions. In the design of blockchain systems, information-theoretic security is not proven. Rather, classical blockchain technology typically relies on security arguments that make assumptions about the limitations of attackers' resources.

In embodiments, the quantum computing system 29100 is configured for detecting adversarial systems, such as adversarial neural networks, including adversarial convolutional neural networks. For example, the quantum computing system 29100 or other system of the platform 29100 may be configured to detect fake trading patterns.

In embodiments, the quantum computing system 29100 includes a quantum continual learning (QCL) system 29132, wherein the QCL system 29132 learns continuously and adaptively about the external world, enabling the autonomous incremental development of complex skills and knowledge by updating a quantum model to account for different tasks and data distributions. The QCL system 29132 operates on a realistic time scale where data and/or tasks become available only during operation. Previous quantum states can be superimposed into the quantum engine to provide the capacity for QCL. Because the QCL system 29132 is not constrained to a finite number of variables that can be processed deterministically, it can continuously adapt to future states, producing a dynamic continual learning capability. The QCL system 29132 may have applications where data distributions stay relatively static, but where data is continuously being received. For example, the QCL system 29132 may be used in quantum recommendation applications or quantum anomaly detection systems where data is continuously being received and where the quantum model is continuously refined to provide for various outcomes, predictions, and the like. QCL enables asynchronous alternate training of tasks and only updates the quantum model on the real-time data available from one or more streaming sources at a particular moment.

In embodiments, the QCL system 29132 operates in a complex environment in which the target data keeps changing based on a hidden variable that is not controlled. In embodiments, the QCL system 29132 can scale in terms of intelligence while processing increasing amounts of data and while maintaining a realistic number of quantum states. The QCL system 29132 applies quantum methods to drastically reduce the requirement for storage of historic data while allowing the execution of continuous computations to provide for detail-driven optimal results. In embodiments, a QCL system 29132 is configured for unsupervised streaming perception data since it continually updates the quantum model with new available data.

In embodiments, QCL system 29132 enables multi-modal-multi-task quantum learning. The QCL system 29132 is not constrained to a single stream of perception data but allows for many streams of perception data from different sensors and input modalities. In embodiments, the QCL system 29132 can solve multiple tasks by duplicating the quantum state and executing computations on the duplicate quantum environment. A key advantage to QCL is that the quantum model does not need to be retrained on historic data, as the superposition state holds information relating to all prior inputs. Multi-modal and multi-task quantum learning enhance quantum optimization since it endows quantum machines with reasoning skills through the application of vast amounts of state information.

In embodiments, the quantum computing system 29100 supports quantum superposition, or the ability of a set of states to be overlaid into a single quantum environment.

In embodiments, the quantum computing system 29100 supports quantum teleportation. For example, information may be passed between photons on chipsets even if the photons are not physically linked.

In embodiments, the quantum computing system 29100 may include a quantum transfer pricing system. Quantum transfer pricing allows for the establishment of prices for the goods and/or services exchanged between subsidiaries, affiliates, or commonly controlled companies that are part of a larger enterprise and may be used to provide tax savings for corporations. In embodiments, solving a transfer pricing problem involves testing the elasticities of each system in the system of systems with a set of tests. In these embodiments, the testing may be done in periodic batches and then may be iterated. As described herein, transfer pricing may refer to the price that one division in a company charges another division in that company for goods and services.

In embodiments, the quantum transfer pricing system consolidates all financial data related to transfer pricing on an ongoing basis throughout the year for all entities of an organization wherein the consolidation involves applying quantum entanglement to overlay data into a single quantum state. In embodiments, the financial data may include profit data, loss data, data from intercompany invoices (potentially including quantities and prices), and the like.

In embodiments, the quantum transfer pricing system may interface with a reporting system that reports segmented profit and loss, transaction matrices, tax optimization results, and the like based on superposition data. In embodiments, the quantum transfer pricing system automatically generates forecast calculations and assesses the expected local profits for any set of quantum states.

In embodiments, the quantum transfer pricing system may integrate with a simulation system for performing simulations. Suggested optimal values for new product prices can be discussed cross-border via integrated quantum workflows and quantum teleportation communicated states.

In embodiments, quantum transfer pricing may be used to proactively control the distribution of profits within a multinational enterprise (MNE), for example, during the course of a calendar year, enabling the entities to achieve arms-length profit ranges for each type of transaction.

In embodiments, the QCL system 29132 may use a number of methods to calculate quantum transfer pricing, including the quantum comparable uncontrolled price (QCUP) method, the quantum cost plus percent method (QCPM), the quantum resale price method (QRPM), the quantum transaction net margin method (QTNM), and the quantum profit-split method.

The QCUP method may apply quantum calculations to find comparable transactions made between related and unrelated organizations, potentially through the sharing of quantum superposition data. By comparing the price of goods and/or services in an intercompany transaction with the price used by independent parties through the application of a quantum comparison engine, a benchmark price may be determined.

The QCPM method may compare the gross profit to the cost of sales, thus measuring the cost-plus mark-up (the actual profit earned from the products). Once this mark-up is determined, it should be equal to what a third party would make for a comparable transaction in a comparable context with similar external market conditions. In embodiments, the quantum engine may simulate the external market conditions.

The QRPM method looks at groups of transactions rather than individual transactions and is based on the gross margin or difference between the price at which a product is purchased and the price at which it is sold to a third party. In embodiments, the quantum engine may be applied to calculate the price differences and to record the transactions in the superposition system.

The QTNM method is based on the net profit of a controlled transaction rather than comparable external market pricing. The calculation of the net profit is accomplished through a quantum engine that can consider a wide variety of factors and solve optimally for the product price. The net profit may then be compared with the net profit of independent enterprises, potentially using quantum teleportation.

The quantum profit-split method may be used when two related companies work on the same business venture, but separately. In these applications, the quantum transfer pricing is based on profit. The quantum profit-split method applies quantum calculations to determine how the profit associated with a particular transaction would have been divided between the independent parties involved.

In embodiments, the quantum computing system 29100 may leverage one or artificial networks to fulfill the request of a quantum computing client. For example, the quantum computing system 29100 may leverage a set of artificial neural networks to identify patterns in images (e.g., using image data from a liquid lens system), perform binary matrix factorization, perform topical content targeting, perform similarity-based clustering, perform collaborative filtering, perform opportunity mining, or the like.

In embodiments, the system of systems may include a hybrid computing allocation system for prioritization and allocation of quantum computing resources and traditional computing resources. In embodiments, the prioritization and allocation of quantum computing resources and traditional computing resources may be measure-based (e.g., measuring the extent of the advantage of the quantum resource relative to other available resources), cost-based, optimality-based, speed-based, impact-based, or the like. In some embodiments the hybrid computing allocation system is configured to perform time-division multiplexing between the quantum computing system 29100 and a traditional computing system. In embodiments, the hybrid computing allocation system may automatically track and report on the allocation of computational resources, the availability of computational resources, the cost of computational resources, and the like.

In embodiments, the quantum computing system 29100 may be leveraged for queue optimization for utilization of quantum computing resources, including context-based queue optimizations.

In embodiments, the quantum computing system 29100 may support quantum-computation-aware location-based data caching.

In embodiments, the quantum computing system 29100 may be leveraged for optimization of various system resources in the system of systems, including the optimization of quantum computing resources, traditional computing resources, energy resources, human resources, robotic fleet resources, smart container fleet resources, I/O bandwidth, storage resources, network bandwidth, attention resources, or the like.

The quantum computing system 29100 may be implemented where a complete range of capabilities are available to or as part of any configured service. Configured quantum computing services may be configured with subsets of these capabilities to perform specific predefined function, produce newly defined functions, or various combinations of both.

FIG. 292 illustrates quantum computing service request handling according to some embodiments of the present disclosure. A directed quantum computing request 29202 may come from one or more quantum-aware devices or stack of devices, where the request is for known application configured with specific quantum instance(s), quantum computing engine(s), or other quantum computing resources, and where data associated with the request may be preprocessed or otherwise optimized for use with quantum computing.

A general quantum computing request 29204 may come from any system in the system of systems or configured service, where the requestor has determined that quantum computing resources may provide additional value or other improved outcomes. Improved outcomes may also be suggested by the quantum computing service in association with some form of monitoring and analysis. For a general quantum computing request 29204, input data may not be structured or formatted as necessary for quantum computing.

In embodiments, external data requests 29206 may include any available data that may be necessary for training new quantum instances. The sources of such requests could be public data, sensors, ERP systems, and many others.

Incoming operating requests and associated data may be analyzed using a standardized approach that identifies one or more possible sets of known quantum instances, quantum computing engines, or other quantum computing resources that may be applied to perform the requested operation(s). Potential existing sets may be identified in the quantum set library 29208.

In embodiments, the quantum computing system 29100 includes a quantum computing configuration service 29110. The quantum computing configuration service may work alone or with the intelligence service 29134 to select a best available configuration using a resource and priority analysis that also includes the priority of the requestor. The quantum computing configuration service may provide a solution (YES) or determine that a new configuration is required (NO).

In one example, the requested set of quantum computing services may not exist in the quantum set library 29208. In this example, one or more new quantum instances must be developed (trained) with the intelligence service 29134 using available data. In embodiments, alternate configurations may be developed with assistance from the intelligence service 29134 to identify alternate ways to provide all or some of the requested quantum computing services until appropriate resources become available. For example, a quantum/traditional hybrid model may be possible that provides the requested service, but at a slower rate.

In embodiments, alternate configurations may be developed with assistance from the intelligence service 29134 to identify alternate and possibly temporary ways to provide all or some of the requested quantum computing services. For example, a hybrid quantum/traditional model may be possible that provides the requested service, but at a slower rate. This may also include a feedback learning loop to adjust services in real time or to improved stored library elements.

When a quantum computing configuration has been identified and available, it is allocated and programmed for execution and delivery of one or more quantum states (solutions).

Trust Networks

Although cryptocurrencies have experienced growth, the mainstream utility of cryptocurrencies as a medium of exchange may be more limited due to lack of payer protections. For example, cryptocurrency funds sent to a fraudulent party may not be readily recovered. A trust network 29300 of the present disclosure generates consensus trust scores for cryptocurrency transactors. The consensus trust scores can offer cryptocurrency transactors a safeguard against fraud while preserving user anonymity and autonomy. The consensus trust scores may provide a baseline level of trust upon which other security layers can be built, including cryptocurrency payment insurance, protection, and restitution.

A trust network 29300 generates consensus trust scores for cryptocurrency transactors. For example, for a cryptocurrency based on blockchain technology, the trust network 29300 can generate consensus trust scores for different blockchain addresses that interact on the blockchain. The trust network 29300 may determine the consensus trust scores based on data retrieved from various data sources (e.g., fraud/custody data) along with blockchain data upon which the cryptocurrency is based. A trust score (e.g., a consensus trust score) may be a number (e.g., a decimal or integer) that indicates a likelihood that the blockchain address is involved in fraudulent activity. Put another way, a trust score can represent the propensity of a blockchain address to be involved with fraudulent activity.

A cryptocurrency transactor can request consensus trust scores from the trust network 29300 before engaging in a cryptocurrency blockchain transaction in which funds (e.g., cryptocurrency blockchain tokens) are transacted on the blockchain. In general, a cryptocurrency transactor can use a consensus trust score to determine whether the blockchain address with which they are transacting is trustworthy. For example, a transactor that intends to send funds to a receiving party may request a consensus trust score for the receiving party. In this example, the transactor can use the consensus trust score for the intended receiver in order to evaluate the likelihood that the intended receiver is a fraudulent party.

Transactors can use consensus trust scores to take a variety of actions. For example, transactors may use consensus trust scores to determine whether to proceed with or cancel a blockchain transaction. As another example, transactors (e.g., digital exchanges) can use consensus trust scores to determine whether to insure a transaction. As another example, organizations can use consensus trust scores to decide whether to accept funds from a blockchain address. As such, the consensus trust scores described herein can help protect transactors from falling victim to fraud or from receiving fraudulent funds. Note that the consensus trust scores inform the transactors of the degree to which any cryptocurrency address may be trusted without requiring the transactor to know the identity of the party behind the address. As such, the consensus trust scores may preserve transactor anonymity.

Figure 293:
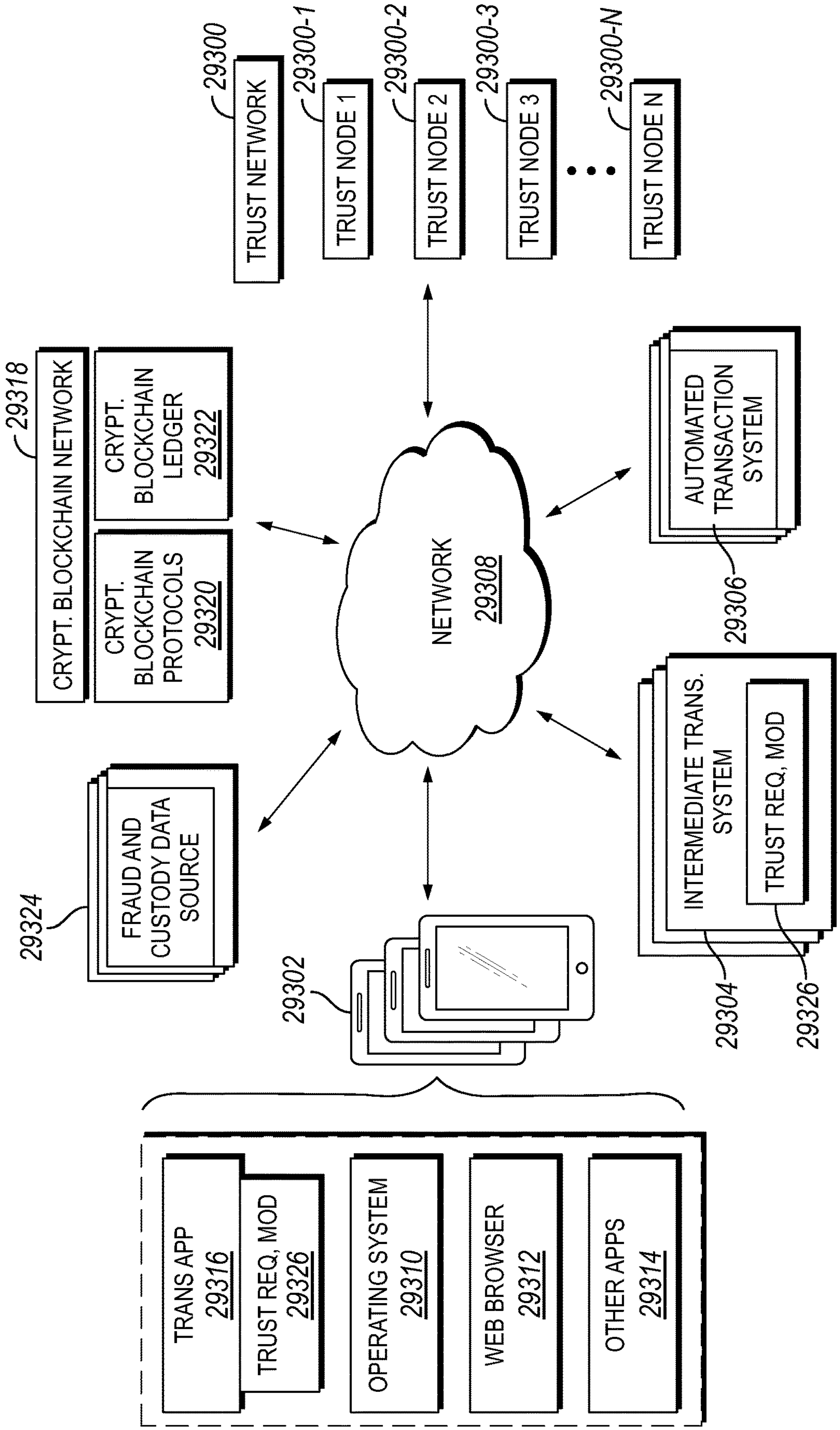

FIG. 293 illustrates an example trust network 29300 in communication with cryptocurrency transactor computing devices 29302, 29304, 29306 (hereinafter "transactor computing devices") via a communication network 29308. The network 29308 may include various types of computer networks, such as a local area network (LAN), wide area network (WAN), and/or the Internet. The trust network 29300 may include a plurality of trust nodes 29300-1, 29300-2, . . . , 29300-N (referred to herein as "nodes"). Each of the nodes 29300 may include one or more node computing devices (e.g., one or more server computing devices) that implement a variety of protocols described herein.

The nodes 29300 may acquire data associated with cryptocurrency blockchain addresses and determine a variety of trust scores based on the acquired data. A trust score determined locally at a node based on the acquired data may be referred to as a "local node trust score" or a "local trust score." The nodes 29300 may be configured to communicate their local trust scores among one another such that each node may have knowledge of local trust scores associated with other nodes. After a node acquires a plurality of local trust scores, the node may determine a candidate consensus trust score (hereinafter "candidate trust score") based on the plurality of local trust scores. One or more nodes may determine a consensus trust score based on the plurality of candidate trust scores. The consensus trust score may indicate a consensus value for a local trust score among a plurality of nodes. The consensus trust score for a cryptocurrency address can be written to a distributed consensus ledger and later retrieved from the trust network 29300 (e.g., in response to a trust request).

The trust scores described herein (e.g., local, candidate, or consensus) can be calculated/provided in a variety of formats. In some implementations, a trust score may be an integer value with a minimum and maximum value. For example, a trust score may range from 1-7, where a trust score of '1' indicates that the blockchain address is likely fraudulent. In this example, a trust score of '7' may indicate that the blockchain address is not likely fraudulent (i.e., very trustworthy). In some implementations, a trust score may be a decimal value. For example, the trust score may be a decimal value that indicates a likelihood of fraud (e.g., a percentage value from 0-100%). In some implementations, a trust score may range from a maximum negative value to a maximum positive value (e.g., −1.00 to 1.00), where a larger negative value indicates that the address is more likely fraudulent. In this example, a larger positive value may indicate that the address is more likely trustworthy. The customer may select the trust score format they prefer.

The distributed trust network 29300 described herein distributes the trust score computational workload across a plurality of nodes to produce a resilient network that is resistant to failure/outage and attack. In some implementations, the trust network 29300 may include a built-in transactional autonomy moderated by a token (e.g., UTOKEN) that allows the trust network 29300 to distribute the computational workload. Additionally, distributing trust calculations throughout the network may provide a resistance to fraud/conspiracy intended to corrupt the network.

The transactor computing devices 29302, 29304, 29306 include computing devices that can interact with the trust network 29300. Example transactor computing devices may include user transactor devices 29302, such as smartphones, tablets, laptop computers, desktop computers, or other computing devices. A user transactor device 29302 may include an operating system 29310 and a plurality of applications, such as a web browser application 29312 and additional applications 29314.

A user transactor device 29302 can include a transaction application 29316 that can transact with a cryptocurrency blockchain network 29318 (hereinafter "cryptocurrency network 29318") to perform blockchain transactions. The transaction application 29316 can also request consensus trust scores from the trust network 29300. Some example transaction applications may be referred to as "wallet applications." In some cases, a transaction application may be referred to as a "decentralized wallet application" if the decentralized wallet application does not interact with centralized server-side components.

Additional example transactor devices may be included in intermediate transaction systems 29304. An intermediate transaction system 29304 (e.g., one or more server computing devices) may communicate with the cryptocurrency network 29318, user transactor devices 29302, and the trust network 29300. An intermediate transaction system 29304 can perform cryptocurrency transactions on behalf of the user transactor devices 29302. The intermediate transaction system 29304 can also acquire consensus trust scores from the trust network 29300 on behalf of the user transactor devices 29302. In some implementations, the intermediate transaction system 29304 can provide a user interface for the user transactor devices 29302 (e.g., via a web-based interface and/or an installed transaction application 29316). An example intermediate transaction system 29304 may include a digital currency exchange (e.g., Coinbase, Inc. of San Francisco CA). In some implementations, exchanges may be decentralized.

Additional example transactor devices may be included in automated transaction systems 29306. An automated transaction system 29306 (e.g., one or more server computing devices) may communicate with the trust network 29300 and the cryptocurrency network 29318. Example automated transaction systems 29306 may include payment systems, such as a payment system or gateway that makes recurring payments (e.g., Stripe, Inc. of San Francisco CA or Plaid Inc. of San Francisco CA).

The transactor devices 29302, 29304, 29306 can engage in transactions on the cryptocurrency network 29318. A cryptocurrency network 29318 may be formed by a network of computing devices that each operate according to cryptocurrency blockchain protocols 29320. The cryptocurrency network 29318 may control a cryptocurrency blockchain transaction ledger 29322 (hereinafter "cryptocurrency ledger 29322"). The cryptocurrency ledger 29322 includes a list of transactions between different cryptocurrency blockchain addresses. The cryptocurrency ledger 29322 may also include additional data, such as transaction metadata. Example cryptocurrency networks 29318 may include, but are not limited to, Bitcoin, Bitcoin Cash, Ethereum, and Litecoin. Although a single cryptocurrency network is illustrated in FIG. 293, the trust network 29300 can provide consensus trust scores for addresses on multiple different cryptocurrency blockchain networks using the techniques described herein.

A cryptocurrency ledger 29322 may include cryptocurrency blockchain addresses that identify transactors on the cryptocurrency network 29318. A transactor may refer to a party that controls transactions for a cryptocurrency blockchain address. For example, a transactor may include an individual or an organization, such as a business, a non-governmental organization, or a decentralized autonomous organization. A transactor can control one or more cryptocurrency blockchain addresses on a single cryptocurrency network. A transactor can also have one or more cryptocurrency blockchain addresses on different cryptocurrency networks.

A transactor can initiate a blockchain transaction in which the transactor's blockchain address sends/receives funds to/from another blockchain address. A blockchain address that sends funds to another blockchain address may be referred to herein as a "blockchain sender address" or a "sender address." The blockchain address that receives funds may be referred to herein as a "blockchain receiver address" or a "receiver address."

Figure 294:
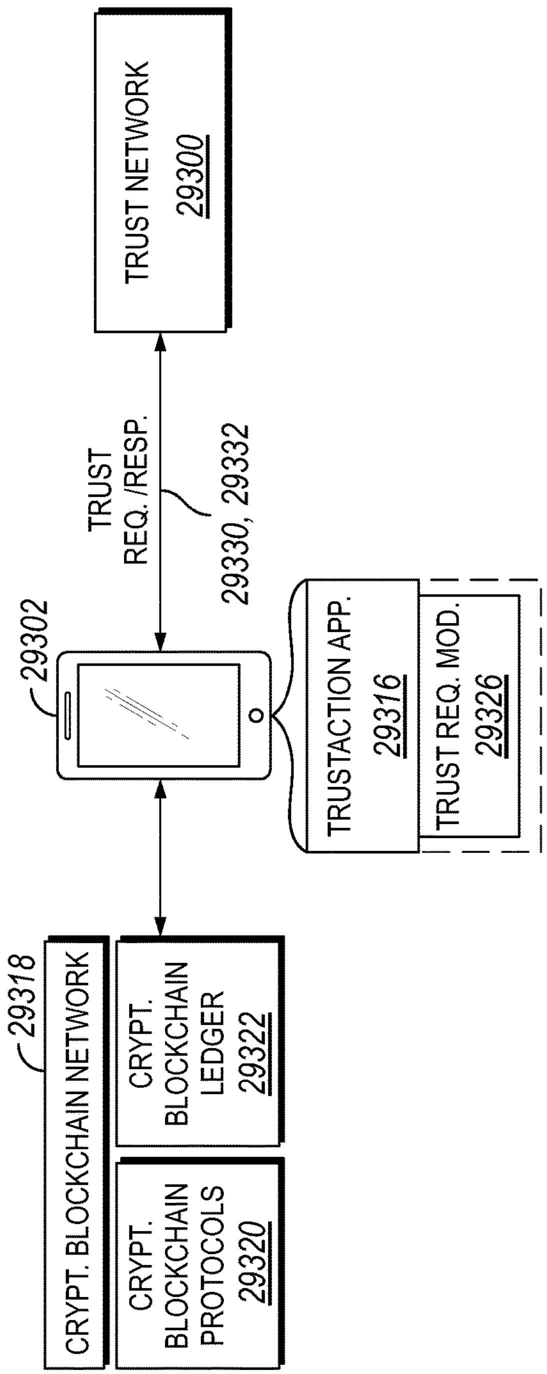
Figure 295:
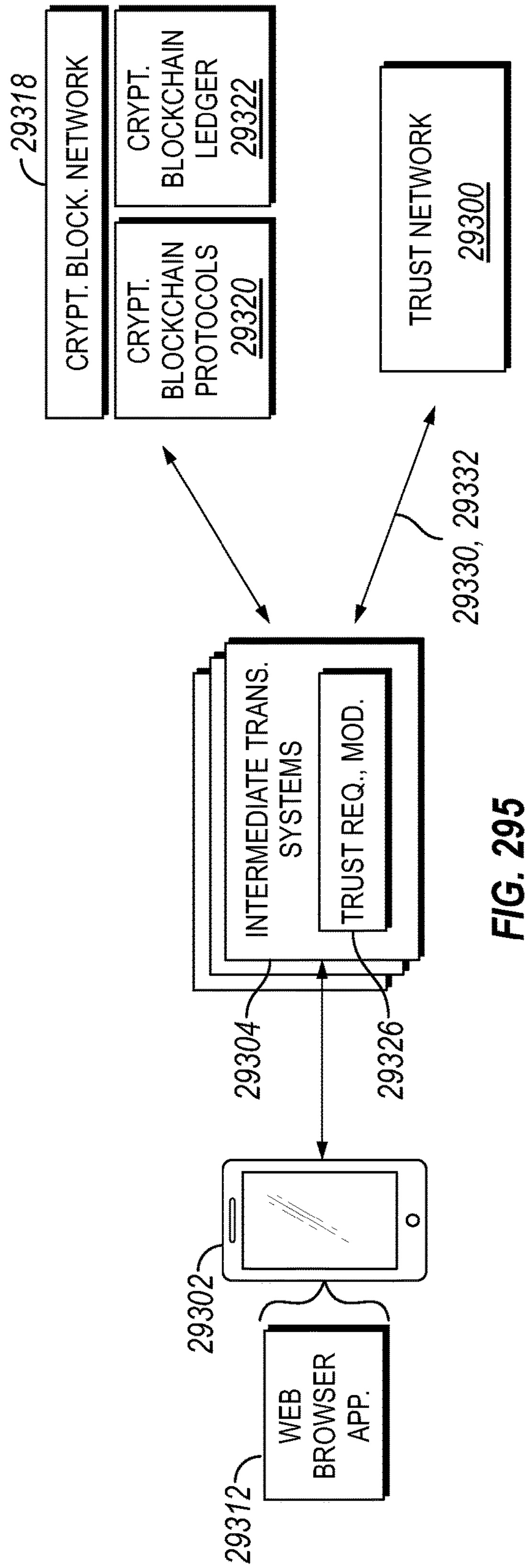
Figure 296:
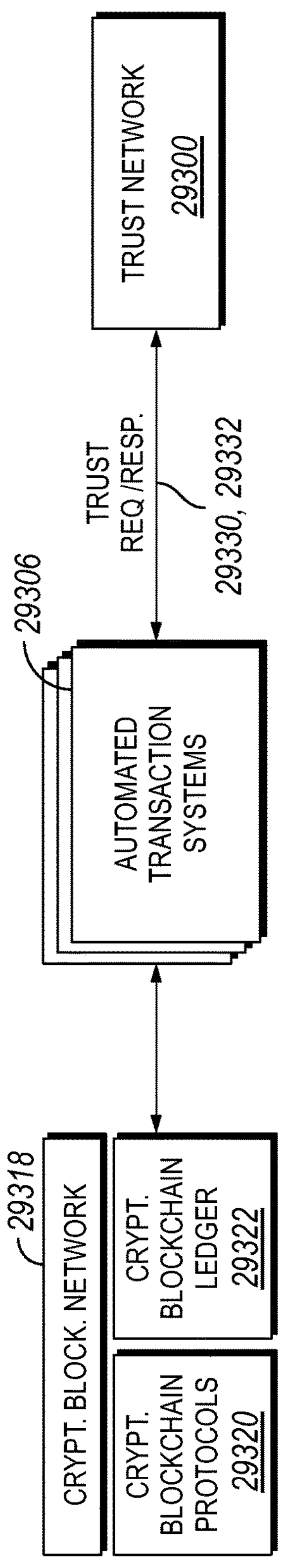

The transactor devices 29302, 29304, 29306 can send trust requests to the trust network 29300 and receive trust responses from the trust network 29300 (e.g., see FIGS. 294-296). The trust request may indicate one or more cryptocurrency blockchain addresses for which the transactor would like a trust report (e.g., one or more consensus trust scores). In some implementations, the trust request can include a request payment, such as a blockchain token and/or fiat currency (e.g., United States Dollars). The request payment may be distributed to nodes in the trust network 29300 as payment for providing the consensus trust score(s).

In one example, a transactor device can send a trust request to the trust network 29300 and receive a trust response (e.g., trust report) from the trust network. The transactor device and trust network 29300 may communicate via an application programming interface (API). The trust request may include a cryptocurrency blockchain address for the transactor on the other side of the transaction. For example, a trust request from a sender may request a trust report for the receiver's blockchain address. The sender may make a decision based on the received trust report, such as whether to engage in the cryptocurrency blockchain transaction with the receiver.

FIGS. 294-296 illustrate interactions between different transactor devices/systems 29302, 29304, 29306, the cryptocurrency network 29318, and the trust network 29300. In FIG. 294, the user transactor device 29302 includes a transaction application 29316 (e.g., a wallet application) that transacts with the cryptocurrency network 29318. The transaction application 29316 includes a trust request module 29326 that interfaces with the trust network 29300. For example, the trust request module 29326 can generate the trust request 29330 (e.g., a web request). The trust request module 29326 can also receive the trust response 29332 from the trust network 29300. In some implementations, the trust request module 29326 can generate a graphical user interface (GUI) that the user may interact with in order to send the trust request 29330 and view the trust report 29332.

In FIG. 295, a transactor device 29302 can transact on the cryptocurrency network 29318 via an intermediate transaction system 29304. For example, in FIG. 295, the transactor device 29302 can include a web browser application 29312 that interacts with the intermediate transaction system 29304. The intermediate transaction system 29304 (e.g., a web server) can provide an interface to the web browser 29312 for transacting on the cryptocurrency network 29318. The intermediate transaction system 29304 may also provide an interface (e.g., a web-based interface) for the user to select whether the user wants a trust report before engaging in the blockchain transaction.

In FIG. 296, an automated transaction system 29306 controls transactions on the cryptocurrency network 29318. The automated transaction system 29306 can also request trust reports from the trust network 29300. In some implementations, the transactions engaged in by the automated transaction system 29306 may depend on the consensus trust scores reported by the trust network 29300. For example, the automated transaction system 29306 can engage in transactions if the trust score indicates that the address is unlikely to be engaged in fraudulent activity.

Although the devices/systems described herein may make a trust request 29330 in order to receive consensus trust scores before making a cryptocurrency blockchain transaction, in some implementations, other devices/systems may request consensus trust scores in other scenarios. For example, compliance officers at an exchange may request consensus trust scores for compliance reasons.

Figure 297:
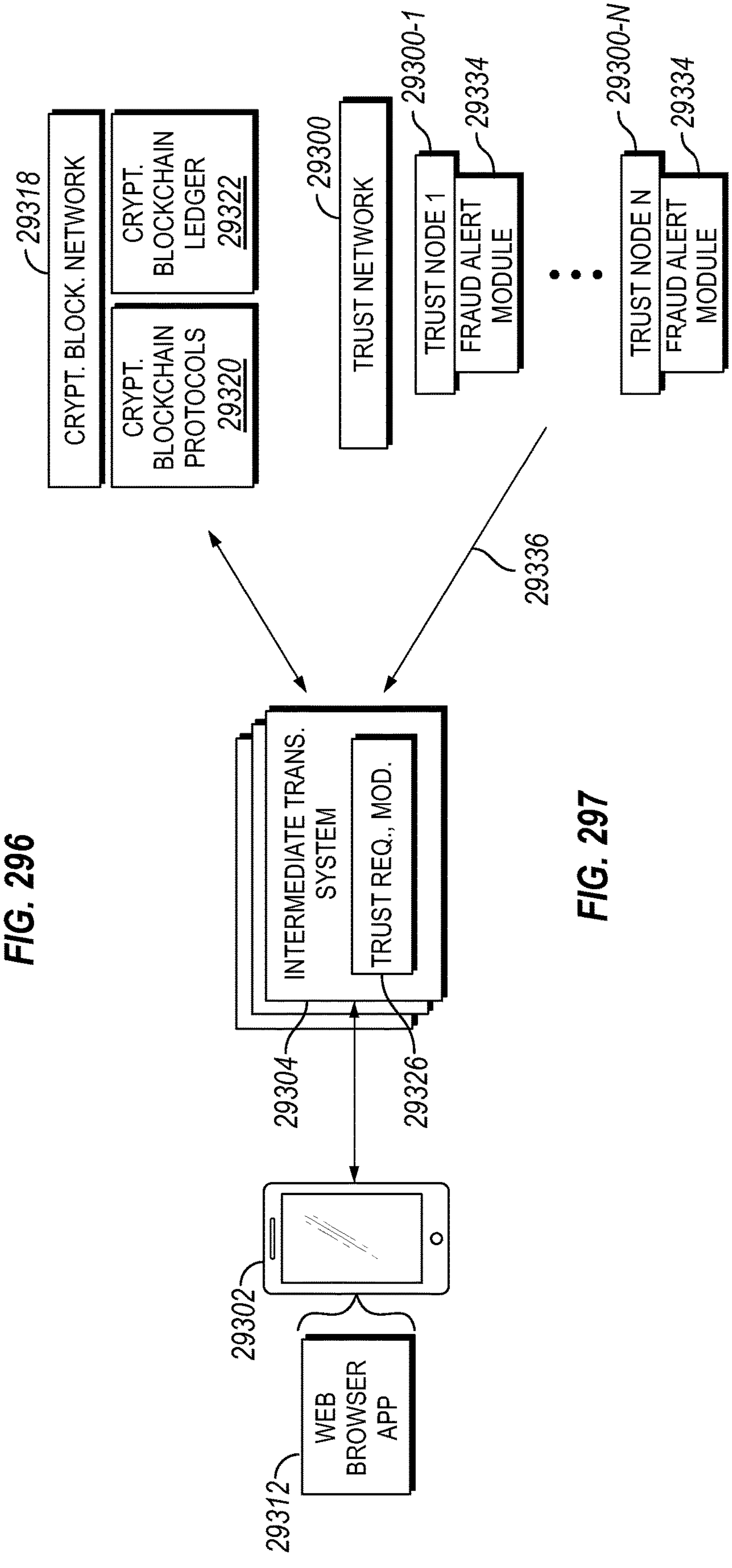

Referring to FIG. 297, in some implementations, the trust network 29300 may implement a fraud alert protocol that can automatically notify network participants (e.g., fraud alert requesting devices) of potentially fraudulent cryptocurrency blockchain addresses. For example, a node may include a fraud alert module 29334 that is configured to provide fraud alerts 29336 under a set of fraud alert criteria that may be configured by a user. In one example, a fraud alert module 29334 may monitor one or more cryptocurrency addresses and provide a fraud alert 29336 if the consensus trust score for any address drops below a threshold level of trustworthiness (e.g., as set by a user). In another example, a fraud alert 29336 may be sent if a monitored trust score changes by more than a threshold percentage. In some implementations, a fraud alert protocol may be implemented using a smart contract that monitors a consensus trust score and provides alerts according to a set of business rules that may be defined by a user. In some implementations, a node may be required to stake an amount of UTOKEN to be eligible to receive fraud alerts.

In some implementations, nodes may be connected via a network of state channels. When a cryptocurrency transactor issues a trust request and payment (e.g., UTOKEN), the request can be gossiped until it reaches a node that has the requested consensus trust score. This node can return the consensus trust score to the cryptocurrency transactor. Payment can then be granted according to the reward protocol.

Example transactors may include, but are not limited to, a custodial exchange, a non-custodial exchange, a custodial wallet, a non-custodial wallet, a new token developer and seller, decentralized applications, blockchain enabled merchants, node operators, algorithm suppliers, and proof of work security providers.

A custodial exchange may refer to an entity (e.g., a company) that enables the exchange of cryptoassets while holding the assets on behalf of their customers. Custodial exchanges may use the consensus trust score to evaluate whether depositing cryptoassets are fraudulent, helping to ensure that their service is not used to launder money. Additionally, a custodial exchange may receive alerts to monitor the blockchain addresses they have in custody. A non-custodial exchange may refer to an entity (e.g., company) that enables the exchange of cryptoassets without holding the cryptoassets on behalf of the token purchaser or seller. Non-custodial exchanges may use the consensus trust score to evaluate the trustworthiness of a counterparty.

A custodial wallet may refer to an entity (e.g., a company) that holds private keys on behalf of customers and enables them to send and receive cryptoassets. Custodial wallets may use the consensus trust score to evaluate whether cryptoassets being deposited are fraudulent and to receive fraud alerts. They may also use the consensus trust score to protect their users from sending cryptoassets to fraudulent addresses. A non-custodial wallet may refer to an entity (e.g., a company) that makes software that allows individuals to hold and transact cryptoassets locally on personal devices. Non-custodial wallets may use the consensus trust score to protect their users from sending cryptoassets to fraudulent addresses and from receiving fraudulent funds.

A new token developer and seller may refer to an entity (e.g., a company or individual) that creates software that, when run by a network of peers, creates a new decentralized token. This company may also sell some initial distribution of the token to interested buyers. These transactors may perform an initial coin offering (ICO). A new token developer and seller may use the consensus trust score to ensure funds being used to purchase their token are not fraudulent, ensuring that they are selling tokens in a compliant manner.

A decentralized application may refer to an application that runs on a decentralized network. These may include applications that manage money, applications where money is involved but require another piece, and other applications, which includes voting and governance systems. Decentralized applications may use the consensus trust score for any activity involving the evaluation of counterparty trust, in addition to protecting participants against fraud.

A blockchain-enabled merchant may refer to an entity (e.g., a company) that accepts payment in the form of cryptoassets (e.g., security tokens). Blockchain-enabled merchants may use the consensus trust score to ensure funds being used as payment are not fraudulent. They may also receive alerts on the addresses with which they interact.

Referring back to FIG. 293, the environment includes data sources 29324 that the trust network 29300 may use to determine whether blockchain addresses are fraudulent. Example data sources 29324 described herein include fraud data sources and custody data sources. The trust network 29300 may determine local trust scores based on the data included in the data sources 29324 along with the data included in the cryptocurrency ledger 29322.

FIG. 298 illustrates an example method that describes operation of the environment illustrated in FIGS. 293-296. For example, the method of FIG. 298 illustrates the determination of local trust scores, candidate trust scores, and a consensus trust score for a single cryptocurrency blockchain address. The method of FIG. 298 may be performed multiple times to determine local trust scores, candidate trust scores, and consensus trust scores for multiple cryptocurrency blockchain addresses.

In block 29400, the nodes 29300 acquire and process fraud and custody data 29324 associated with a cryptocurrency address. In block 29402, the nodes 29300 acquire and process cryptocurrency blockchain data associated with the cryptocurrency address. In block 29404, the nodes 29300 each determine local trust scores for the cryptocurrency address based on the data acquired in blocks 29400-29402.

In block 29406, the nodes 29300 communicate the local trust scores for the cryptocurrency address with one another. After communication of the local trust scores, each of the nodes may include a plurality of local trust scores calculated by other nodes. In block 29408, the nodes 29300 determine candidate trust scores for the cryptocurrency address based on the local trust scores. In block 29410, the nodes 29300 determine a consensus trust score for the cryptocurrency address based on the candidate trust scores for the cryptocurrency addresses. In block 29412, the nodes 29300 can update a distributed consensus trust score ledger to include the calculated consensus trust score. In blocks 29414-29416, the trust network 29300 receives a trust request 29330 for the cryptocurrency address from a requesting device and sends a trust response 29332, including the consensus trust score, to the requesting device.

FIG. 299 illustrates generation of local trust scores. FIGS. 300-301 illustrate generation of consensus trust scores. In addition to generating trust scores, the trust network 29300 may implement additional features described with respect to FIGS. 302-304. In some implementations, the trust network 29300 may implement a reputation protocol that calculates and stores reputation values that indicate a variety of parameters associated with the nodes, such as an amount of work performed by the nodes (e.g., see FIG. 302).

In some implementations, the trust network 29300 may implement a token economy that operates as a medium of exchange in the trust network 29300. The token economy described herein uses a token referred to as "UTOKEN." Each of the nodes may implement a wallet module (e.g., see FIG. 303) that can send, receive, stake, and burn UTOKEN according to the protocols implemented in the trust network.

In some implementations, the trust network 29300 may implement a reward protocol that tracks various parameters of the nodes (e.g., an amount of work) and rewards the nodes using UTOKEN (e.g., see FIGS. 303-304). The trust network 29300 may also implement a staking protocol that determines the functionality of the nodes and penalizes certain node behaviors (e.g., the production of fraudulent data).

Different nodes in the trust network 29300 may be configured to implement different features of the trust network 29300. For example, different nodes may be configured to implement different protocols, or portions of protocols, described herein. In some implementations, the staking protocol may determine which features the nodes may implement. The modules and data stores included in the nodes may represent the protocols implemented by the nodes and the data stored by the nodes. Each node may include one or more computing devices. In some implementations, multiple nodes may be run on a single computing device.

FIG. 299 illustrates an example node 29300-1 that includes a trust score determination module 29500 and a local trust data store 29502. The trust score determination module 29500 acquires and processes a variety of data described herein, such as fraud and custody data 29324 along with blockchain data. The local trust data store 29502 can store data for a plurality of cryptocurrency addresses.

The data associated with a single cryptocurrency address is illustrated herein as a blockchain address record 29504. The local trust data store 29502 may include a plurality of such blockchain address records, each for a different cryptocurrency address. Each blockchain address record 29504 can include a blockchain address 29506 that uniquely identifies the record 29504. Each blockchain address record 29504 can also include a local trust score 29508 associated with the blockchain address 29506. The blockchain address record 29504 may include a history of local trust scores calculated over time for the blockchain address.

The blockchain address record 29504 described herein represents data stored in the local trust data store 29502. The node 29300-1 may include a variety of different data structures that are used to implement the data. Accordingly, the blockchain address record 29504 may be implemented using one or more different data structures than explicitly illustrated herein.

In FIG. 299, the trust score determination module 29500 acquires and processes a variety of types of data, such as custody data and fraud data 29324. Example fraud and custody data may include data that provides evidence of fraud with respect to a cryptocurrency address and/or indicates the party that owns/controls the cryptocurrency address. The trust score determination module 29500 may store custody and fraud data related to a cryptocurrency address in the blockchain address record 29504. The trust score determination module 29500 may also generate a fraud label that indicates whether the cryptocurrency address is likely fraudulent based on the acquired fraud data.

The trust score determination module 29500 acquires and processes blockchain data (e.g., the cryptocurrency ledger 29322). The trust score determination module 29500 may store raw and processed blockchain data relevant to a cryptocurrency address in the blockchain address record 29504. Example cryptocurrency blockchain data may include data for a plurality of blockchain transactions between a plurality of different cryptocurrency addresses.

The trust score determination module 29500 determines local trust scores for the cryptocurrency addresses based on the acquired blockchain data and fraud/custody data. In some implementations, the trust score determination module 29500 may generate a blockchain graph data structure based on the blockchain data (e.g., see FIG. 317). The trust score determination module 29500 may also process the graph to determine one or more graph-based values (e.g., importance values) that may be used to generate local trust scores.

In some implementations (e.g., see FIG. 318), the trust score determination module 29500 may generate scoring features for cryptocurrency addresses and generate one or more scoring models based on the scoring features and other data (e.g., labeled fraud data). In these implementations, the trust score determination module 29500 may generate one or more local trust scores for blockchain addresses using one or more scoring models and the scoring features associated with the blockchain addresses. FIGS. 312-319 illustrate a more detailed implementation of the trust score determination module 29500 and the local trust data store 29502.

A plurality of nodes can communicate with one another in order to come to a consensus trust score for a cryptocurrency address. Each node may be identified (e.g., uniquely identified) by a node identifier (ID). In some implementations, a public/private key pair is generated upon inception of a node. In these implementations, a node's public key may serve as a node ID, although other identifiers may be used.

Different nodes may compute the same/similar local trust scores in cases where the different nodes have access to the same/similar cryptocurrency blockchain data and fraud/custody data. In some cases, the local trust scores may differ among nodes. For example, the local trust scores may differ when nodes have access to different fraud and custody data. In a specific example, nodes located in different jurisdictions (e.g., countries) may have access to data sources that are blocked in other jurisdictions. In another specific example, some nodes may access information at different rates.

The nodes 29300 implement a trust consensus protocol that determines consensus trust scores for cryptocurrency addresses. The consensus trust scores can be stored in a consensus trust score ledger 29600 that is distributed to nodes across the trust network 29300. FIG. 300 illustrates an example node 29300-1 that includes a consensus determination module 29510 and a trust consensus data store 29512 (hereinafter "consensus data store 29512"). The trust network 29300 can include a plurality of nodes that include the functionality described with respect to FIGS. 300-301. The consensus determination module 29510 can communicate with other consensus determination modules (e.g., via communication module 29510-1) of other nodes to determine consensus trust scores. The consensus data store 29512 includes the consensus trust scores and other data in a consensus trust score ledger 29600.

The consensus determination module 29510 can communicate with other nodes (e.g., consensus modules of other nodes). For example, each node may communicate its local trust score to other nodes via outgoing trust consensus messages 29602. Additionally, each node may receive local trust scores from other nodes via incoming trust consensus messages 29604. An example trust consensus message may include a node ID, a node IP address, a cryptocurrency blockchain address and an associated local trust score. In some cases, instead of indicating an associated local trust score, a trust consensus message may indicate that a local trust score has not been calculated or is in the process of being calculated.

The consensus determination module 29510 can generate a local trust score list 29606 ("trust score list 29606") based on the local trust scores received from other nodes (e.g., using list building module 29510-2). The trust score list 29606 may include a list of node IDs and corresponding local trust scores for a cryptocurrency address. The consensus determination module 29510 may generate a local trust score list 29606 for each cryptocurrency address. Each node can communicate its trust score list to other nodes. For example, a node can send/receive trust score messages that include trust score lists. A node can update the local trust score list based on other received trust score lists.

Each node in the trust network 29300 may be configured to communicate with different sets of nodes. Put another way, nodes in the trust network 29300 may be configured to communicate with non-overlapping sets of nodes. Since different nodes may communicate with different sets of other nodes, eventually, each of the nodes communicating local trust scores with one another may have knowledge of other nodes' local trust score calculations. In this scenario, different nodes may include similar trust score lists. In some examples, the trust scores in the trust score lists may converge in fractions of a second or a matter of seconds.

The trust score list 29606 for a cryptocurrency address may include a frequency (count) distribution of local trust scores. In some cases, the trust score list 29606 may include a large number of local trust scores within a tight grouping. In some cases, a trust score list 29606 may include outlier trust scores that have values outside of a major grouping. For example, an outlier may be due to variations in information used to produce the local trust scores. As another example, one or more outliers may be caused by nodes that are producing/distributing fraudulent trust scores. As described herein, nodes that produce/distribute fraudulent trust scores may be held accountable (e.g., via burning of staked funds).

The consensus determination module 29510 determines a candidate trust score based on the local trust scores included in the trust score list 29606 (e.g., using candidate determination module 29510-3). In some implementations, the consensus determination module 29510 may include "candidate determination criteria" that trigger the determination of a candidate trust score. Example candidate determination criteria may include the presence of local trust scores for a threshold number of nodes and/or a threshold fraction of nodes. For example, the consensus determination module 29510 may determine a candidate trust score in response to the presence of a threshold number/fraction of local trust scores included in the trust score list.

In some implementations, the consensus determination module 29510 may determine a candidate trust score in response to the distribution pattern of trust scores in the trust score list. For example, the consensus determination module 29510 may be triggered to determine a candidate trust score when the trust scores are centered in a distribution (e.g., tightly centered in a single distribution). If the trust score distribution includes outliers, the consensus determination module 29510 may continue communicating local trust scores with the other nodes. In a specific example, the consensus determination module 29510 may be triggered to determine a candidate trust score when the variance of a distribution is less than a threshold variance. In cases where there are multiple modes of distribution, the consensus determination module 29510 may determine whether the modes are valid or whether the modes are due to fraudulent trust scores. Similarly, if the variance of the distribution is too great (e.g., greater than a threshold value), the consensus determination module 29510 may determine whether the variance is due to variations in calculations and/or fraudulent behavior. The consensus determination module 29510 may filter out (i.e., remove) trusts scores that are attributable to fraudulent behavior before determining a candidate trust score.

The consensus determination module 29510 can determine the candidate trust score using a variety of techniques. In some implementations, the consensus determination module 29510 may remove outlier local trust scores from the trust score list before determining the candidate trust score. The consensus determination module 29510 may determine the candidate trust score based on an average (e.g., a blended average) of the remaining local trust scores in the trust score list 29606. For example, the consensus determination module 29510 may determine the candidate trust score by using a statistically weighted average of local trust scores based on node count.

The nodes may communicate the candidate trust scores between one another. The nodes may also store the candidate trust scores 29608. A set of consensus determination modules can determine a consensus trust score for a cryptocurrency address based on a plurality of candidate trust scores 29608. In some implementations, consensus determination modules may monitor the candidate trust scores to determine whether the candidate trust scores are converging on a similar trust score. The consensus determination modules may be configured to determine a consensus trust score in response to one or more consensus triggers associated with the candidate trust scores. For example, the consensus determination modules may be configured to determine a consensus trust score if greater than a threshold number/fraction of candidate trust scores are in agreement (e.g., within a threshold variance).

In some implementations, the consensus determination modules may perform validation operations associated with the candidate trust scores (e.g., using validation module 29510-4). For example, the consensus determination modules may perform error checking of the candidate trust scores. The error checking operations may include verifying whether communication of local trust scores actually occurred for the candidate scores or whether a conspiracy occurred that led to the candidate scores. In some implementations, the consensus determination modules can query a plurality of nodes that participated in communication of local trust scores and determination of candidate scores to determine what the plurality of nodes communicated to one another. In some implementations, the nodes may elect a leader node to perform the error checking operations and determine whether the nodes are in agreement.

After validating the candidate trust scores, the consensus determination module 29510 may calculate the consensus trust score. In some implementations, the consensus determination modules may determine the consensus trust score based on an average (e.g., a blended average) of the candidate trust scores. For example, the consensus determination modules may determine the consensus trust score by using a statistically weighted average of candidate trust scores based on count. The consensus determination module 29510 may then update the consensus ledger 29600 with the consensus trust score. The consensus determination module 29510 may then distribute the updated ledger to other nodes (e.g., using the ledger update module 29510-5). In some implementations, only a subset of the nodes can write trust scores and other data to the consensus ledger 29600, although nodes that do not participate in generating the consensus ledger 29600 may receive updated versions of the consensus ledger 29600.

The consensus ledger 29600 includes consensus trust scores for different cryptocurrency addresses over time. The consensus trust scores included in the consensus ledger 29600 may be provided to trust score requestors. The consensus ledger 29600 can also include timing data that indicates when the consensus trust scores were written to the ledger 29600. For a determined consensus trust score, the consensus ledger may include validation information associated with the consensus trust score, such as the candidate trust scores used for the consensus trust score and the nodes that were validated. Storing the validation information for a consensus trust score may allow the nodes to review how the consensus trust scores were validated.

The nodes 29300 may be configured to generate new trust scores for new cryptocurrency addresses and update the trust scores over time. For example, the trust score determination modules may be configured to generate/update local trust scores for cryptocurrency addresses. As another example, the consensus determination modules may be configured to generate/update candidate trust scores and consensus trust scores over time. The frequency of updates can be set by the consensus protocol. In some cases, data associated with cryptocurrency addresses may change over time. In some cases, data included in the cryptocurrency blockchain may change over time. The trust score determination modules and consensus determination modules may be configured to generate new trust scores in response to such changes in data.

In some implementations, the consensus determination modules may communicate new local trust scores and/or updated local trust scores to other nodes. For example, the consensus determination modules may communicate updates in local trust scores to other nodes if the update resulted in greater than a threshold amount of change in the local trust score. Updates to the local trust scores may cause changes in candidate trust scores. In turn, changes to candidate trust scores may cause a change in consensus trust scores and the consensus ledger. In this manner, the consensus ledger 29600 may reflect the history of consensus trust scores over time for a plurality of cryptocurrency addresses.

Different nodes may have different levels of functionality with respect to the calculation of trust scores. The differing functionality may be based on the amount of value (e.g., UTOKEN) staked by the nodes, where a greater staked amount can authorize more functionality. In some implementations, all nodes may be authorized to buy trust scores and include copies of consensus ledgers. In these implementations, a subset of nodes may be configured to calculate local trust scores, candidate trust scores, and consensus trust scores. Additionally, the subset of nodes, or a further subset, may be configured to write consensus trust scores to the consensus ledger.

FIG. 301 illustrates an example method that describes calculation of a consensus trust score from the perspective of an example node 29300-1. The method of FIG. 301 may be performed multiple times to determine local trust scores, candidate trust scores, and consensus trust scores for multiple cryptocurrency blockchain addresses.

In blocks 29610-29612, the trust score determination module 29510 acquires and processes fraud and custody data 29324 and cryptocurrency blockchain data. In block 29614, the trust score determination module 29510 determines a local trust score for a cryptocurrency address. In block 29616, the consensus determination module 29510 receives local trust scores from other nodes. In block 29618, the consensus determination module 29510 sends local trust scores to other nodes.

In block 29620, the consensus determination module 29510 determines whether to calculate a candidate trust score (e.g., based on candidate determination criteria). If the candidate determination criteria are not satisfied, the consensus determination module 29510 may continue communicating local trust scores with other nodes in blocks 29616-29618. If the consensus determination module 29510 determines that the candidate determination criteria are satisfied, in block 29622, the consensus determination module 29510 may determine a candidate trust score based on the local trust scores in the trust score list 29606. In block 29624, the consensus determination module 29510 may determine a consensus trust score based on a plurality of candidate trust scores. In block 29626, the consensus determination module 29510 may update the consensus trust ledger 29600 to include the consensus trust score.

Referring to FIG. 302, the trust network 29300 may implement a reputation protocol in which a plurality of nodes each may compute one or more reputation values. The reputation values for a node may indicate a variety of parameters associated with the node, such as an amount of work the node performed during trust score calculations and distribution, the quality of the work performed (e.g., the accuracy), and the consistency of node operation (e.g., node uptime). The reputation values may be used by other protocols in the trust network 29300. For example, nodes may determine candidate and/or consensus trust scores based on the reputation values associated with one or more nodes. As another example, the nodes may be awarded and/or punished according to their reputation values.

The node 29300-1 includes a reputation determination module 29700 that determines reputation values for the node. In some implementations, the nodes 29300 can transmit reputation messages 29704-1, 29704-2 to other nodes. The reputation messages 29704 can include reputation data, such as reputation values associated with one or more nodes. In this manner, each node may receive reputation values for a plurality of other nodes. In a specific example, each node can be configured to communicate reputation data with a set of other nodes. In this specific example, each node can directly request reputation data from any node in the set of nodes. Additionally, each node may also request reputation data for a plurality of other nodes from any node in the set of nodes.

The node includes a reputation data store 29702 that stores reputation data for a plurality of nodes (e.g., a subset of nodes on the trust network). The reputation data may be stored in a reputation ledger 29706 that includes a plurality of node IDs along with associated reputation values. The reputation data store 29702 may also store additional information 29708, such as data used for generating reputation values and data associated with generating the consensus trust scores.

The reputation determination module 29700 can determine a plurality of different reputation values for each node. In some implementations, the reputation determination module 29700 may determine one or more work reputation values for the amount of work a node performs with respect to calculating trust scores. For example, the reputation determination module 29700 may determine one or more reputation values based on the number of local trust scores calculated, the number of candidate trust scores calculated, and the amount of work related to calculating consensus trust scores. One or more work reputation values may also be based on an amount of communication (e.g., trust consensus messages) performed by the node.

The reputation determination module 29700 may also determine a plurality of quality reputation values for nodes based on the quality of the calculations performed by the nodes. For example, the quality reputation values may be based on a number of trust score outliers produced by the nodes and how fast trust scores were produced. The reputation determination module 29700 may also determine a plurality of distribution reputation values for nodes based on the distribution of consensus trust scores to requestors and the distribution of trust scores as fraud alerts.

The reputation determination module 29700 may also determine a plurality of node performance reputation values based on a variety of node parameters, such as node bandwidth, node processing power, node throughput, and node availability. Example reputation values associated with node availability may be based on uptime values, mean time between failure (MTBF) values, and/or mean time to repair (MTTR) values.

The reputation determination module 29700 may determine one or more data storage reputation values based on the amount of data (e.g., historic data) stored at a node and the amount of time for which the data is stored. The reputation determination module 29700 may also determine one or more reputation values that indicate an amount of time the node has been included (e.g., online) in the trust network 29300. The reputation determination module 29700 may determine one or more staking reputation values based on the amount staked by a node. Additionally, the reputation determination module 29700 may determine one or more outlier reputation values that indicate a number of outliers associated with a node and whether the outliers were considered fraudulent or supported by evidence.

In some implementations, the reputation determination module 29700 may calculate one or more composite reputation values, each of which may be a function of any individual reputation values described herein. For example, a composite reputation value may be a weighted calculation of one or more component reputation values.

The reputation data store 29702 may store information in addition to the reputation ledger. For example, the reputation data store 29702 may store historic trust score data or other data used to determine the reputation values. In one example, the reputation data store 29702 may store a history of each of the trust scores and contribution to the trust scores from each node. In a more specific example, the historical data may include the number of nodes that participated in the consensus calculation, the range of scores used in the calculation, along with other factors upon which the consensus scores were based.

In some implementations, the consensus determination module 29510 can determine candidate trust scores and/or consensus trust scores based on one or more reputation values. For example, the consensus determination module 29510 may determine whether a trust score is an outlier based on the reputation associated with the node. In some implementations, the consensus determination module 29510 may consider reputation values during validation operations.

Referring to FIG. 303, in some implementations, the trust network 29300 may implement a token economy that operates as a medium of exchange in the trust network 29300. For example, the trust network nodes may include utility token modules 29800 that implement a utility token protocol 29802. The utility token protocol 29802 may be powered by a token (e.g., a native utility token). The utility token may be assigned a name (e.g., a coined name). For example, the utility token may be referred to herein as "UTOKEN," although other names may be used.

The trust network 29300 includes a utility token blockchain ledger 29806 that may be stored in utility token data stores 29804 across the nodes. The utility token ledger 29806 may be a version of a public transactional ledger integrated into the trust network 29300. The utility token ledger 29806 may include a list of UTOKEN transactions between different utility token blockchain addresses. For example, the utility token ledger 29806 may indicate the various transactions associated with the nodes 29300, such as the purchase of UTOKEN, purchase of trust scores, payment into the reward protocol, rewards paid by the reward protocol, and amount of funds staked by the nodes. The utility token ledger 29806 may also include additional data, such as transaction metadata.

UTOKEN can be used in a variety of ways on the trust network 29300. In some implementations, UTOKEN can be used as payment for access to trust scores and fraud alerts. In some implementations, UTOKEN can be used to reward nodes for performing work. In some implementations, a node may stake UTOKEN in order to enable additional functionality within the trust network 29300. Although UTOKEN is described herein as a medium of exchange in the trust network 29300, other payment types may be used as a medium of exchange in the trust network 29300. For example, other types of payments/tokens may be used for acquiring trust scores, acquiring fraud reports, paying rewards, and staking. In some implementations, the utility token modules 29800 may implement smart contracts for the trust network 29300. Communication between the nodes during implementation of the utility token protocol is illustrated at 29801.

Initially, the trust network 29300 may include a set number of UTOKEN. For example, there may initially be 1,000,000,000 UTOKEN. UTOKEN may be initially granted and/or sold to nodes. In some implementations, the supply of UTOKEN may expand in a deflationary manner, which may track economic indicators including the total number of nodes, transaction volume, staking amount, and fractionalization of the UTOKEN token.

Each node may include a wallet module 29814 that can be used to perform transactions on the utility token blockchain 29806. The wallet module 29814 may implement a variety of functionalities. In some implementations, the wallet module 29814 may be used to purchase trust scores. Payments for trust scores may be put into the reward protocol, as described herein. In some implementations, the wallet module 29814 may be used to send/receive UTOKENS (e.g., with other nodes). In some implementations, the wallet module 29814 can be used to stake UTOKEN. In some implementations, the wallet module 29814 can lock UTOKEN, thereby indicating to the trust network 29300 that the locked UTOKEN are not available to be sent until unlocked. In some implementations, the wallet module 29814 can be used to burn UTOKEN. Burning UTOKEN may prevent the burnt UTOKEN from being used for any function in the future.

The trust network 29300 may implement a reward protocol that receives payments for a variety of activities, such as purchasing a trust score and purchasing fraud alerts. The trust network 29300 may pay out UTOKEN to nodes (e.g., node wallets) based on a variety of factors. The nodes include reward modules 29808 and reward data stores 29810 that implement the reward protocol. For example, the reward modules 29808 can receive UTOKEN payments and pay out UTOKEN as a reward payment to nodes (e.g., according to work performed). The reward data store 29810 may store a reward ledger 29816 that indicates the nodes that received reward payments along with the corresponding factors (e.g., work performed) associated with the reward payments. For example, the reward ledger 29816 may provide an accounting of the amount of UTOKEN received by the reward protocol, the calculation of the rewards, and the amount of UTOKEN paid out to different nodes in response to the calculations. UTOKEN payments associated with the reward protocol may be stored according to one or more reward addresses on the utility token ledger 29806.

The reward protocol can receive UTOKEN from a variety of sources. For example, the reward protocol can receive UTOKEN that was used to purchase trust score reports. As another example, the reward protocol can receive UTOKEN used to purchase fraud alerts.

The reward protocol can make reward payouts to nodes based on a variety of factors associated with the nodes. In some implementations, the reward protocol may pay rewards to nodes based on reputation values associated with the nodes. The reward protocol can examine one or more reputation ledgers 29706 to determine the reputation values associated with the nodes. The reward payout calculations may be a multifactor calculation that includes one or more reputation values. The reward calculations and payments may be performed periodically in some cases.

In some implementations, the reward protocol may pay rewards based on one or more work reputation values that indicate an amount of work a node performed with respect to calculating/communicating trust scores. The reward protocol may pay a larger portion of rewards for nodes that perform more work with respect to calculating and communicating trust scores. In some implementations, the reward protocol may pay rewards based on one or more quality/distribution reputation values for nodes based on the quality of the calculations performed by the nodes. The reward protocol may pay a smaller portion of rewards for nodes that produce outlier trust scores.

In some implementations, the reward protocol may pay rewards based on one or more distribution reputation values for nodes based on the distribution of consensus trust scores to requestors and the distribution of trust scores as fraud alerts. The reward protocol may pay a larger portion of rewards for nodes that distribute a greater amount of trust scores. In some implementations, the reward protocol may pay rewards based on one or more performance reputation values. For example, the reward protocol may pay larger rewards to nodes with greater bandwidth, processing power, throughput, and availability.

In some implementations, the reward protocol may pay rewards based on one or more data storage reputation values. For example, the reward protocol may pay larger rewards to nodes that store more data. In some implementations, the reward protocol may pay rewards based on one or more reputation values that indicate an amount of time the node has been included (e.g., online) in the trust network 29300. For example, the reward protocol may pay larger rewards to nodes that have been online for a longer period of time in the trust network 29300. In some implementations, the reward protocol may pay rewards based on one or more staking reputation values. For example, the reward protocol may pay larger rewards to nodes that have staked more UTOKEN.

In some implementations, algorithm suppliers may be rewarded in UTOKEN for providing nodes that contribute algorithms to the ecosystem. In some implementations, proof of work security providers that may validate the UTOKEN ledger using a proof-of-work consensus algorithm may receive UTOKEN as a block reward to incentivize their participation in the ecosystem. Communication between the nodes during implementation of the reward protocol is illustrated at 29803.

FIG. 304 illustrates an example method that describes operation of the reward protocol. In block 29900, the reward protocol receives payments for trust scores and fraud alerts. In block 29902, the reward protocol retrieves reputation values for a plurality of nodes. In block 29904, the reward protocol determines reward payouts to the plurality of nodes based on the reputation values associated with the nodes. In block 29906, the reward protocol pays the nodes according to the determined payouts. In block 29908, the reward protocol updates the reward ledgers 29816 to reflect the payment calculations (e.g., based on reputation values) and the payment amounts. The reward protocol may periodically repeat the method of FIG. 304 so that the nodes may be periodically rewarded for their relative contributions to the trust network 29300.

The trust network 29300 may implement a staking protocol (e.g., using staking modules 29812) in which each node can stake an amount of UTOKEN. The amount of UTOKEN staked may determine the level of functionality afforded to the node. The staked UTOKEN can be reflected in the utility token ledger 29806.

Staked UTOKENs may be under the temporary control of the trust network 29300. For example, in some implementations, the reward protocol may penalize a node by removing staked UTOKEN. In some implementations, the staking functionality may be implemented as a smart contract in which violation of the contract results in the surrender (e.g., burning) of some staked UTOKEN. In these implementations, fulfillment of the smart contract results in the UTOKEN being returned to the staking party. In some implementations, the reward protocol may penalize a node for producing outlier trust scores if the outlier scores are determined to be fraudulent.

In some implementations, a node can be formed when a network participant stakes a quantity of UTOKEN (e.g., a required quantity). The amount of UTOKEN staked by a node may determine the amount of functionality that may be implemented by the node. For example, staking more UTOKEN may allow a node to implement a greater amount of network functions. In these cases, nodes may be assigned different levels of functionality. A lower level node may have functionality that is limited to requesting trust scores. Higher level nodes may participate in calculating local trust scores, candidate trust scores, and consensus trust scores. There may be any number of node levels that may perform any number of services on the trust network 29300. If the trust network penalizes a node and burns the node's stake, the node may descend in level and lose the corresponding functionality. Communication between the nodes during implementation of the staking protocol is illustrated at 29805.

In some implementations, the cost a node is required to pay for a trust score may decrease as the amount of UTOKEN staked by the node increases. In these cases, the more a node stakes, the fewer UTOKEN is required for acquiring a trust score (e.g., via real-time reporting). An example relationship of staked UTOKEN and consensus trust score cost is described in the table of FIG. 308. In one specific example, to be eligible for the discount, the staked amount of UTOKEN may be required to be staked for a period of time (e.g., at least 90 days).

FIGS. 305-306 illustrate example GUIs that may be generated on a user transactor device 29302 by the transaction application 29316 or the intermediate transaction system 29304. The illustrated GUIs may be for a sender in a cryptocurrency transaction. It can be assumed that the cryptocurrency network on which the blockchain transactions occur in FIGS. 305-306 use units of "coins" for transactions. The top portion of the GUIs includes fields that indicate the sender's information, such as the sender's blockchain address and their balance (e.g., 100 coins). The top portion of the GUIs also include fields in which the sender can specify a receiver address and indicate the transaction amount (e.g., 5 coins) for the potential transaction. The GUIs include a "Send Coins" GUI element that can initiate the specified transaction between the sender and the receiver.

The lower portion of the GUIs in FIGS. 305-306 provide the sender with the option of acquiring a trust report from the trust network 29300 before engaging in the transaction. For example, in FIG. 305, the user can select (e.g., touch/click) the "Request Trust Report" GUI element to send a trust request to the trust network 29300. The trust request may include the receiver's address, as specified in the "To:" box above. FIG. 306 illustrates an example trust report received in response to the trust request.

In FIG. 306, the received trust report indicates that the receiver had a trust score of −0.90. It can be assumed in this case that a negative valued trust score near −1.00 indicates that the receiver address is likely fraudulent. Similarly, a positive valued trust score near 1.00 may indicate that the receiver address is not likely fraudulent. In addition to the numeric score of −0.90, the trust report also summarizes the meaning of the trust score number. Specifically, the trust report indicates that the "trust score indicates that the receiver has likely engaged in fraudulent activity." The GUI also provides a "Cancel Transaction" GUI element that the sender may select (e.g., touch/click) to cancel the specified transaction.

In some implementations, the sender may be charged an amount for requesting the consensus trust score. In implementations where the sender is transacting via an exchange, the exchange may spend UTOKEN into the reward protocol to retrieve the consensus trust score. In implementations where the sender does not interact via an intermediate transaction system 29304, the sender may purchase UTOKEN from the trust network 29300 for use in acquiring a consensus trust score.

FIG. 307 illustrates an example in which the trust network 29300 is queried as part of a payment insurance process. In FIG. 307, the user transactor device 29302 transacts on the cryptocurrency blockchain network 29318 via an intermediate transaction system. The intermediate transaction system 30110 includes a trust request module 29326 that can retrieve trust reports from the trust network 29300. The intermediate transaction system 30110 may also provide payment insurance to the transactor.

The intermediate transaction system 30110 of FIG. 307 includes a payment insurance module 30112 that may determine whether a transaction will be insured. The terms on which transactions are insurable may be agreed to by the owner/operator of the intermediate transaction system 30110 and the owner/operator of the payment insurance system 30114 (e.g., an underwriter system). In some implementations, payment insurance may be provided for transactions in which the transacting blockchain addresses have trust scores that indicate a low likelihood of fraud. The payment insurance system 30114 can acquire data related to the transactions (e.g., trust scores, timing, etc.) for auditing purposes.

In FIG. 307, initially, the transactor device 29302 may initiate a transaction with the intermediate transaction system 30110. In response to the initiated transaction, the intermediate transaction system 30110 (e.g., the trust request module 29326) may retrieve a trust report for the receiver and/or the sender. The intermediate transaction system 30110 may then determine whether the transaction is insurable. For example, the payment insurance module 30112 may determine whether the transacting blockchain addresses have trust scores that indicate a low likelihood of fraud. In some implementations, the payment insurance module 30112 may compare consensus trust scores to trust score threshold values that indicate a maximum tolerable likelihood for fraud. In these implementations, the payment insurance module 30112 may indicate that the transaction is insurable if the consensus trust score(s) are less than the trust score threshold value. If the consensus trust score(s) are greater than the tolerable level for fraud, payment insurance may be declined.

In some implementations, the payment insurance module 30112 may query the payment insurance system 30114 to determine whether the transaction is insurable. The query may indicate the consensus trust scores for the transacting parties. In these implementations, the payment insurance system 30114 can make the determination of whether to insure the transaction. The payment insurance system 30114 may then notify the intermediate transaction system 30110 of whether the transaction is insurable.

In addition to the trust network 29300 playing a part in payment insurance processes, the trust network 29300 may also play a role in other financial processes. For example, the trust scores/reports generated by the trust network 29300 may be used in order to freeze transactions and/or clawback funds.

The trust network 29300 may include any number of nodes. As described herein, the nodes 29300 may have different levels of functionality (e.g., based on stake). The levels of nodes may be variable and different levels of nodes may be eligible to participate in different services. FIG. 309 illustrates example services associated with three different levels of nodes.

In some implementations, level 1 nodes may stake a minimum quantity of UTOKEN, X, for a period of time (e.g., at least 90 days). Level 1 nodes may perform all node activities in some implementations. In addition to performing updates to trust scores and participating in real-time reporting, a level 1 node may participate in trust score processing and the trust quorum, gathering and validating evidence of fraud and custody, and sending transactors fraud alerts. Level 1 nodes may be the most important nodes in some implementations. In some cases, to maintain the security of the trust network, there should be a minimum number of level 1 nodes (e.g., 29300 level 1 nodes). A decentralized autonomous organization (DAO) may include a mandate to run additional level 1 nodes in the event that the minimum is not met.

In some implementations, level 2 nodes may stake the minimum quantity of UTOKEN (e.g., proportional to X/2) for a period of time (e.g., at least 90 days) to perform trust score updates and participate in the trust quorum. Level 2 nodes may additionally update the UTOKEN ledger, add evidence of custody to the blockchain, and deliver fraud alerts. Level 3 nodes may stake the minimum quantity of UTOKEN (e.g., proportional to X/5) for a period of time (e.g., at least 90 days) to validate fraud and custody evidence.

Trust report requests can be stored in a node's transaction mempool for processing and prioritization. Each node level may have a separate transaction mempool. Level 3 nodes, for example, may not store report requests in some implementations. Level 1, however, may store report requests (e.g., state channel updates). In some implementations, nodes that participate in fraud and custody verification can use separate mempools for those purposes.

Nodes may earn rewards for performing services. For example, nodes may earn rewards proportional to their level. When a cryptocurrency transactor accesses a trust score, the UTOKEN may be split between the awarded nodes. Additionally, when a block is secured in the utility token blockchain, nodes may earn a percentage (e.g., 45%) of the mining reward.

A node level can have a respective reward queue. The amount of the mining reward (e.g., 45% of the mining reward) each node receives can be proportional to the amount they staked (e.g., their node level). When a node joins the trust network 29300, it may be placed at the bottom of the queue. It may go up the queue so long as it actively provides service on the trust network 29300 (e.g., proof of service). When it reaches the top of the queue (e.g., top 10%), it may be eligible for reward selection. In a specific example, the probability of random selection may be 1/n, where n is the number of nodes in the top 10% of the queue.

In a specific implementation, the target par value for the cost of node services may be 1 UTOKEN, while the par value of node earnings may be 1.2 UTOKEN. In this specific implementation, the consensus trust score prices are set above cost to help ensure rewards for nodes.

A node contribution program can enable nodes to co-develop algorithms for the consensus trust score. This program may be a path to contribution that allows nodes to better the accuracy of the algorithm (e.g., predictive algorithm) that assigns trust scores. The program may allow the network to evolve to best fit new use cases and exploits on the blockchain. Rewards to contributors may be controlled by the DAO through a bounty program.

The utility token protocol may be governed by a DAO. The DAO may allow the protocol to keep pace with new developments. Participants may use UTOKEN to vote in the DAO. The DAO may be funded with an endowment of the initial token supply (e.g., 5%) and receive a percentage of mining rewards (e.g., 10% of every mining reward). If the number of level 1 nodes falls below a set number (e.g., 29300), the DAO may run the minimum required nodes using DAO funds.

The DAO may determine protocol updates including adjusting supply coefficients, setting bounties to update the protocol, improving or adjusting existing integrations with partners, and accepting work when it is done. The DAO may assign and reward the bounty program. If malicious actors attempt to exploit the trust network 29300, a bug bounty for algorithms may be opened to address that particular pattern, thereby strengthening the whole ecosystem. The DAO may additionally approve changes to open source bot software.

The DAO may control key system variables, including the number of UTOKEN staked per node level, staking period, and cryptocurrency transactor discounts per staking amount.

Correctly proportioned node staking may enable a healthy token economy. The DAO may adapt the protocol to ensure there is enough UTOKEN in circulation to facilitate transactions and sufficient staking to promote a healthy and balanced token velocity. FIG. 311 illustrates sample UTOKEN staking amounts and number of level 1 nodes. For example, the chart may describe example node numbers for when there is between 35 percent and 50 percent of UTOKEN in circulation.

Nodes may separate the work of updating trust scores into cliques based on the organic underlying graph topology of the blockchain. Cliques can then be assigned to nodes to update and report on. The separation of the graph into cliques may prevent individual nodes from having full access to all of the trust data. This may protect the integrity of the token economy while still maintaining a full graph. There may be an overlap of addresses within cliques. As the number of nodes increases, clique overlap may increase.

The table of FIG. 310 illustrates an example relationship of the number of nodes, the number of cliques, the address overlap, and the probability that a node will get a single address in their control. Here, overlap may scale with the number of nodes. The security of the trust network 29300 may scale with the number of nodes on the trust network 29300. The maximum probability of a node getting a specific address is 5%, with a minimum of 5 overlapping addresses per clique.

The probability of a node getting a single address may be determined by: P(Address A)=(number of cliques with Address A)/(total number of cliques).

However, the probability of getting control of a specific address may be different than the probability of getting control of any address. If a participant only has one node, that participant cannot get control over a single address, since other nodes contain that address in their cliques as well.

The high cost to become a node may be one way the network prevents Sybil attacks. Because clique placement may be pseudo-random, in some cases, a malicious actor must control 51% of the nodes on average to have 51% control over a single address.

A hypergeometric distribution described below may be used to calculate the probability of a node randomly getting 51% control of a single address or any address.

N = Number of nodes
B = Bad nodes (who want to control address)
O = Overlap
C = Number of nodes to control for 51% = (O/2) + 1
P(control over a specific address) =

$$\prod_{k=C}^{O} \frac{(B \text{ choose } k)((N-B)\text{choose}(O-k))}{(N \text{ choose } O)}$$

The more nodes there are and the higher the cost of UTOKEN, the more difficult it is to mount such an attack. For the base case of 29300 nodes with 5 overlap, the probability of getting 51% control of an address may be: P(51% control)=P(3 nodes gain control over address)+P(4 nodes gain control over address)+P(5 nodes gain control over address)=$\Pi_{k=3}^{5}$ (5 choose k) (95 choose 5−K)/(100 choose 5)=6.2 e-05.

When the number of cliques increases to 1,000, and overlap increases to 50, the probability becomes 1.7 e-10. As the number of nodes and cliques increase, the probability of a 51% attack to control the trust score of any single address approaches 0.

FIG. 312 is an example detailed functional block diagram of the trust score determination module 29500 (hereinafter "trust module 29500") and the local trust data store 29502. FIG. 313 is a method that describes operation of the trust module 29500. Referring to FIG. 312, the trust module 29500 acquires and processes a variety of data described herein. The processed data can be included in the local trust data store 29502. The data associated with a single cryptocurrency blockchain address is illustrated herein as a blockchain address record 29504. A record data store 30010 may include a plurality of such blockchain address records 29504, each for a different blockchain address. Each blockchain address record 29504 can include a blockchain address 29506 that uniquely identifies the record. The blockchain address record 29504 described herein represents data stored in the local trust data store 29502. The local trust data store 29502 may include a variety of different data structures that are used to implement the data. Accordingly, the blockchain address record 29504 may be implemented using one or more different data structures than explicitly illustrated herein.

FIG. 313 is a method that describes operation of the trust module 29500 illustrated in FIG. 312. In block 30030, the data acquisition and processing module 30000 acquires and processes a variety of types of data 29324, such as custody data and fraud data (e.g., see FIG. 314). The data acquisition and processing module 30000 may store custody and fraud data 30018 related to a blockchain address in the blockchain address record 29504. The data acquisition and processing module 30000 may also generate a fraud label 30020 that indicates whether the blockchain address is likely fraudulent based on the acquired fraud data.

In block 30032, the blockchain acquisition and processing module 30002 acquires and processes blockchain data (e.g., the blockchain ledger 29322) (e.g., see FIG. 315). The blockchain acquisition and processing module 30002 may store raw and processed blockchain data 30022 relevant to a blockchain address in the blockchain address record 29504. In block 30034, the graph generation and processing module 30004 generates a blockchain graph data structure based on the blockchain data (e.g., see FIGS. 316-317). The blockchain graph data structure may be stored in the graph data store 30012. The graph generation and processing module 30004 may also process the graph to determine one or more graph-based values 30024 (e.g., importance values) that may be used to generate local trust scores.

In block 30036, the feature generation module 30006 generates scoring features 30026 for blockchain addresses (e.g., see FIG. 318). In block 30038, the scoring model generation module 30008 generates one or more scoring models based on the scoring features and other data (e.g., labeled fraud data). The one or more scoring models may be stored in the scoring model data store 30014. In block 30040, the score generation module 30016 generates one or more local trust scores 29508 for blockchain addresses using one or more scoring models and the scoring features associated with the blockchain addresses (e.g., see FIG. 319). Data related to the requests and responses for consensus trust scores may be stored as request data 30028 of the blockchain address record 29504.

Detailed examples of the trust module 29500 and the local trust data store 29502 are now described with respect to FIGS. 314-316 and FIGS. 318-319. Various modules and data stores have been omitted from the figures for illustration purposes only. For example, the various modules and data stores have been omitted to focus on the functionality associated with the modules and data stores that are illustrated.

FIG. 314 illustrates data acquisition and processing of fraud and custody data sources. FIG. 315 illustrates acquisition and processing of blockchain data. FIGS. 316-317 illustrate generation and processing of a blockchain graph data structure. FIG. 318 illustrates scoring feature generation and scoring model generation. FIG. 319 illustrates the generation of local trust scores for a blockchain address using a scoring model and scoring features for the blockchain address.

Referring to FIG. 314, the data acquisition and processing module 30000 includes a data acquisition module 30000-1 that acquires data from the fraud and custody data sources 29324. The data acquisition and processing module 30000 also includes a data processing module 30000-2 that processes the acquired data. The raw and processed data 30018 can be stored in the record data store 30010. The data acquisition module 30000-1 can acquire data in a variety of ways. In some implementations, the data acquisition module 30000-1 can acquire curated data, such as curated/purchased data provided by partners/customers. In some cases, data can be user peer-reviewed structured data.

In some implementations, the data acquisition module 30000-1 may be configured to automatically acquire data (e.g., crawl/scrape websites). For example, the data acquisition module 30000-1 may be configured to do targeted data acquisition, such as acquiring data for specific social media accounts. As another example, the data acquisition module 30000-1 may perform more general data acquisition, such as more general crawling/scraping of sites.

The data acquisition module 30000-1 can acquire custody data from custody data sources 29324-1. Custody data may indicate the party that owns/controls the blockchain address (e.g., the keys). Example parties that may take custody of blockchain addresses may include, but are not limited to, exchanges, wallets, and banks. In some implementations, the custody sources 29324-1 can provide the custody data.

In some implementations, the trust module 29500 may implement custodian specific trust score generation. For example, the trust module 29500 may select a specific scoring model based on the custodian associated with the blockchain address. In some implementations, the trust module 29500 may implement customer/custodian specific reporting for blockchain addresses (e.g., based on the custodian associated with the blockchain address). For example, the trust report may be formatted in a specific manner for a specific custodian.

The data acquisition module 30000-1 acquires data that may provide evidence of fraud from a variety of fraud data sources 29324-2. The trust module 29500 may make a determination of the likelihood of fraud for blockchain addresses based on fraud data. For example, the trust module 29500 may label blockchain addresses as fraud based on the fraud data. Subsequently, the trust module 29500 may generate scoring features and scoring models based on the labeled blockchain addresses.

In some implementations, the trust module 29500 may be configured to acquire databases and lists that indicate fraudulent activity associated with a blockchain address. In one example, fraud data sources 29324-2 can include databases of fraud information, such as third-party databases of fraud information and/or customer provided databases of fraud information. The databases may be provided by public entities (e.g., government watchlists) and/or private entities (e.g., a company generated watchlist).

In some examples, a database of fraud information may be provided in the form of a blacklist that includes a list of blockchain addresses that have been identified as having engaged in fraud. In this example, the data acquisition module 30000 may acquire public blacklists, purchase blacklists, and/or receive blacklists from customers. In some cases, blacklists may have been peer reviewed by a community of trusted parties (e.g., experts). In some implementations, the data processing module 30000-2 can mark addresses as fraudulent if the address is included on a blacklist. In other implementations, the presence of the blockchain address on a blacklist can be used as a scoring feature for determining whether the blacklisted blockchain address is likely fraudulent.

In some implementations, the data acquisition module 30000-1 may be configured to acquire fraud data from targeted locations, such as locations on the internet specified by web uniform resource locators (URLs) and/or usernames (e.g., a specific social media account). In some implementations, locations may be provided (e.g., web URLs) that the data acquisition module 30000-1 may monitor for fraudulent activity. For example, a customer may provide a web address to a social media page associated with a specific blockchain address. In this example, the data processing module 30000-2 may identify fraudulent behavior if a blockchain address other than the specified blockchain address appears in the web contents at the web address. In another example, if there is a known contribution address of an initial coin offering (ICO), accounts and blockchain addresses fraudulently attempting to acquire funds (e.g., phish) may be detected. The trust network 29300 may notify a user of the fraudulent address and use the evidence of fraudulent activity as described herein.

Although the data acquisition module 30000-1 may be configured to acquire fraud data from targeted locations, in some implementations, the data acquisition module 30000-1 can generally crawl and scrape other data sources (e.g., social media sites) for fraud data and other data. In these examples, the data processing module 30000-2 may identify fraudulent blockchain addresses based on behavior across a social media platform, such as scams that request funds from multiple social media users, new accounts that directly ask other users for funds, and fake initial coin offering scams.

In some implementations, the trust module 29500 (e.g., the data processing module 30000-2) may label a blockchain address as fraudulent (e.g., at 30020). For example, the data processing module 30000-2 may label a blockchain address as fraud based on fraud data. In a specific example, the data processing module 30000-2 may label a blockchain address as fraud if the blockchain address is included in one or more blacklists. If a blockchain address is not labeled as fraud, the fraud status of the blockchain address may be unknown. Put another way, an unlabeled blockchain address does not necessarily indicate that the blockchain address is not fraudulent. In some cases, a blockchain address may be labeled as a known good address that is not fraudulent. For example, an exchange wallet or verified smart contract may be examples of known good addresses.

For blockchain addresses that are assigned one or more trust scores and labeled as fraud, the fraud label for the blockchain address may be dispositive on the issue of fraud for the blockchain address. As such, in these implementations, the trust module 29500 may disregard the trust score for the blockchain address and/or set the trust score for the blockchain address to a 100% certainty of fraud. In other implementations, the trust module 29500 may continue to calculate trust scores for the blockchain addresses labeled as fraud.

The fraud label 30020 can also include fraud label metadata. The fraud label metadata may indicate the source of the information used to label the blockchain address as fraud (e.g., a specific blacklist). The fraud label metadata may also indicate a type of fraud (e.g., a phishing scam). The fraud label metadata can also include the content of the fraudulent behavior, such as text associated with a scam (e.g., text posted online or in an email). The trust module 29500 can return the fraud label metadata to a requesting device to clearly explain the reason the trust module 29500 has labeled a blockchain address as fraudulent.

Referring to FIG. 315, the blockchain data acquisition module 30002-1 (hereinafter "blockchain acquisition module 30002-1") can acquire blockchain data from the blockchain network 29318. For example, the blockchain acquisition module 30002-1 can acquire the blockchain transaction ledger 29322. The blockchain acquisition module 30002-1 can store the raw blockchain data 30022 in the record data store 30010. The blockchain processing module 30002-2 can process the blockchain transaction ledger 29322 and store the processed blockchain values 30022 (e.g., transaction amounts, dormancy, etc.) in the record data store 30010 (e.g., in a blockchain address record 29504).

The blockchain transaction ledger 29322 includes data for a plurality of blockchain transactions. Each transaction may include: 1) a sender address, 2) a receiver address, and 3) a value amount (e.g., a coin amount). A transaction may also include transaction identification data that uniquely identifies the transaction on the blockchain. The transaction identification data may be referred to herein as a transaction identifier (ID). In some implementations, a transaction hash can be used as a unique identifier for a transaction. A transaction hash may be a string of pseudorandom characters that uniquely identify a transaction. Some blockchains may also include additional data that may be stored and processed. Example additional data may include internal transaction data, such as a program that is executed in an Ethereum smart contract.

The blockchain transaction ledger can include a plurality of blocks. Each of the blocks can include a collection of transactions. A block may include a collection of transactions that occurred on the blockchain within a certain period of time. A block may include a block number (e.g., a sequentially assigned number) that may act as an identifier for the block. In the case of Bitcoin, a transaction may include the sending party's address, the receiving party's address, the amount sent, and various parameters describing speed. Ethereum may include similar transaction data, as well as raw data around what function on a smart contract was executed, if a function was executed.

Different blockchain networks may include different types of blockchain ledgers. For example, different blockchain ledgers may include blockchain transaction data in different formats. As another example, different blockchain ledgers may include additional or alternative data associated with transactions. The blockchain acquisition module 30002-1 can be configured to acquire blockchain transaction data for different blockchains. For example, the blockchain acquisition module 30002-1 can include different modules, each of which may be configured for acquiring blockchain transaction data for a different blockchain network.

In some cases, a blockchain network can include timing data that indicates the time of blockchain transactions (e.g., relative/absolute time). In these implementations, the blockchain acquisition module 30002-1 can use the provided timing data to indicate when the transaction occurred. In other cases, a blockchain network may not include timing data. In these implementations, the blockchain acquisition module 30002-1 can generate a time stamp for the transaction. In some cases, timing data can be generated from the block assigned to the transaction. Blocks may be assigned as part of the mining process whereby actors on the blockchain compete to verify the validity of a set of transactions. Once a block is mined, and the transactions are verified, then the timing data can be assumed from other miners' consensus.

The blockchain processing module 30002-2 can determine a variety of values based on the acquired blockchain data. The trust module 29500 (e.g., the score generation module 30016) can use the determined values as scoring features for determining trust scores. The trust module 29500 (e.g., the model generation module 30008) can also generate scoring models based on the determined values. The blockchain values for a blockchain address can be stored in the blockchain address record (e.g., at 30022).

The blockchain processing module 30002-2 can include functionality for determining the different blockchain values described herein. For example, the blockchain processing module 30002-2 of FIG. 315 includes a dormancy determination module 30050 that can determine dormancy values for a blockchain address. The blockchain processing module 30002-2 also includes a behavior identification module 30052 that can determine whether the blockchain address matches one or more behavioral templates (e.g., patterns or fingerprints). The modules 30050, 30052 included in the blockchain processing module 30002-2 of FIG. 315 are only example modules. As such, the blockchain processing module 30002-2 may include additional/alternative modules than those modules illustrated in FIG. 315. Additionally, the blockchain values included in the blockchain data 30022 of FIG. 315 are only example values. As such, the blockchain data for a blockchain address may include additional/alternative values.

In some implementations, the blockchain processing module 30002-2 may determine values associated with the amount of funds transacted by a blockchain address. For example, the blockchain processing module 30002-2 may determine: 1) a total amount of funds received by the blockchain address, 2) a total amount of funds sent by the blockchain address, 3) the total amount of funds transacted in and out of the blockchain address, and 4) the average transaction amount for the blockchain address.

In some implementations, the blockchain processing module 30002-2 may determine values associated with the timing of transactions associated with a blockchain address. For example, the blockchain processing module 30002-2 can determine an activity level of the blockchain address, such as how often the address is involved in a transaction (e.g., average times between transactions and variance). As another example, the blockchain processing module 30002-2 can determine the age of transactions associated with the address. Another example scoring feature related to timing may include the time between entrance of funds and exit of funds from a blockchain address (e.g., timing for a single transaction or average over multiple transactions). In some cases, fraudulent activity may not immediately exit an address.

As another example, the dormancy determination module 30050 can determine the probability of dormancy for the blockchain address. An example dormancy probability may indicate an amount of time for which the blockchain address is not associated with transactions. For example, a dormancy probability may indicate an amount of time for which the blockchain address is not associated with transactions relative to the address' expected time between transactions. Put another way, the example dormancy time may indicate the probability that the blockchain address is dormant. With respect to dormancy likelihood, fraudulent addresses may not stay active for long in some cases.

In some implementations, the blockchain processing module 30002-2 may determine values associated with the timing of transactions and the amount of the transactions. For example, the blockchain processing module 30002-2 may determine: 1) a total amount of funds received over a period of time, 2) a total amount of funds transferred over a period of time, and 3) a total amount of funds transacted over a period of time.

In some implementations, the blockchain processing module 30002-2 may determine values associated with how the blockchain address interacts with other blockchain addresses. For example, the blockchain processing module 30002-2 may determine the list of addresses that have interacted with the blockchain address and/or the total number of addresses that have interacted with the blockchain address (e.g., as senders and/or receivers). This value may be iteratively computed to determine how important an address is to its local neighborhood and the blockchain as a whole.

The blockchain processing module 30002-2 includes a behavior identification module 30052 that can determine whether a blockchain address matches specific behavior templates that may be indicative of fraud. If the behavior identification module 30052 identifies a match between a blockchain address' behavior and a behavior template, the match may be stored in the blockchain address record 29504. In some implementations, the local trust data store 29502 may store a set of behavior templates. In these implementations, the behavior identification module 30052 can determine whether the blockchain address' behavior matches one or more of the set of behavior templates.

A behavior template may include a set of conditions that, if satisfied, cause the behavior template to be matched to the blockchain address. A behavior template may include conditions that are based on any of the blockchain values described herein. For example, a behavior template may include conditions that are based on at least one of 1) amounts of funds transferred, 2) the number of transactions, 3) the timing of transactions (e.g., rate of transactions), 4) how the blockchain address interacts with other addresses (e.g., number of different senders/receivers and patterns of transactions), and 5) the likelihood of dormancy of the address.

In one specific example, a behavior template may define a threshold number of transactions (e.g., 5 transactions in and out) at a threshold rate. In this example, the behavior template may be matched if a blockchain address engages in a low number of transactions (e.g., less than or equal to the threshold number) in quick succession (e.g., a short rapid burst). Another example condition for the behavior template may be a high dormancy probability, as any transactions may be limited to bursts. In another specific example, a behavior template may define a high threshold number of transactions (e.g., irregularly high for the blockchain). In this example, a behavior template may be matched if the blockchain address engages in greater than the threshold number of transactions. In this example, the behavior template may also require a high importance value, such that the blockchain address is required to have a minimum importance value to match the template. Furthermore, the behavior template may require a low likelihood of dormancy, as the fraudulent behavior may follow a pattern of regular transactions.

If the blockchain address matches a behavior template, the match may be stored as a blockchain value in the blockchain address record 29504. For example, the blockchain address record may store a binary value (e.g., 0/1) for each behavior template that indicates whether the behavior template was matched. In implementations where the behavior identification module 30052 determines a value (e.g., a decimal or integer value) that indicates how well the blockchain address matches the behavior template, the value may be stored in the blockchain address record 29504.

Referring to FIGS. 316-317, the graph generation module 30004-1 generates a blockchain graph data structure based on the blockchain transactions for a plurality of different blockchain addresses. The graph data structure includes blockchain addresses and transactions between the blockchain addresses. For example, for each blockchain address, the graph data structure may describe each transaction associated with the blockchain address along with the direction of the transaction, such as whether the blockchain address was a sender or receiver. The graph data structure can also include the transaction amount for each transaction. In some implementations, the graph data structure can include fraud data (e.g., fraud labels). The fraud label can indicate that the address has been involved in fraudulent activity (e.g., a known fraudulent address).

FIG. 317 illustrates an example representation of the graph data structure. In FIG. 317, the graph data structure is represented by nodes and edges. The graph data structure includes blockchain addresses as nodes of the graph. The transactions between blockchain addresses are edges between the nodes, where the arrows indicate the direction of the transaction (e.g., the receiver is at the arrowhead). The amount for each transaction is labeled adjacent to the arrow. The fraud label for each blockchain address is included above the node. FIG. 317 includes 4 transactors with blockchain addresses A, X, Y, Z. Blockchain address Y has been labeled as a fraudulent address. The other blockchain addresses have an unknown fraud status. The graph illustrates 3 blockchain transactions. A first transaction is from blockchain address X to blockchain address A for a first amount (i.e., amount 1). A second transaction is from blockchain address Y to blockchain address A for a second amount (i.e., amount 2). A third transaction is from blockchain address A to blockchain address Z for a third amount (i.e., amount 3).

The graph data structure is stored in the graph data store 30012. The graph generation module 30004-1 can update the graph data structure over time so that the graph data structure includes an up to date representation of the transactions included on the blockchain network 29318.

The graph processing module 30004-2 can generate graph-based values 30024 using the graph data structure. The graph-based values 30024 may be stored in the blockchain address record 29504. The graph processing module 30004-2 can update the graph-based values 30024 over time.

In some implementations, the graph processing module 30004-2 can determine one or more importance values for each of the blockchain addresses. The importance values may indicate the importance of a blockchain address relative to other blockchain addresses (e.g., relative to all blockchain addresses). In some implementations, the graph processing module 30004-2 may determine the importance values for a blockchain address based on adjacent blockchain addresses. In some implementations, the graph processing module 30004-2 may weight the contribution of adjacent blockchain addresses by the importance of the blockchain addresses.

In some implementations, the graph processing module 30004-2 may determine an importance value by counting the number of transactions coming into a blockchain address. In this specific example, more transactions may indicate that the blockchain address is more important than other blockchain addresses with fewer incoming transactions. In some implementations, the graph processing module 30004-2 may determine an importance value by determining the number of different blockchain addresses with which the blockchain interacts. In some implementations, the graph processing module 30004-2 may determine an importance value that indicates the total amount of funds into the blockchain address relative to the amount of funds out of the address (e.g., amount out divided by amount in). In another example, the graph processing module 30004-2 may determine an importance value that indicates the number of transactions into the blockchain address relative to the number of transactions out of the blockchain address (e.g., total number of transactions in divided by total number of transactions out). In another example, the graph processing module 30004-2 may determine an importance value based on the number of transactions in to the blockchain address, the number of transactions out of the blockchain address, the amount of funds in, and the amount of funds out. In some implementations, the graph processing module 30004-2 may implement other processing techniques, such as PageRank (PR) and/or personalized hitting time (PHT).

In some implementations, the graph processing module 30004-2 may determine a fraud distance scoring feature that indicates the blockchain address' distance from fraud in the graph. For example, fraud distance scoring features may include a minimum distance from fraud, an average distance from fraud, and/or the number of fraudulent blockchain addresses with which the blockchain address has interacted.

Referring to FIG. 318, the feature generation module 30006 can generate scoring features for each of the blockchain addresses. The trust module 29500 (e.g., score generation module 30016) can generate one or more local trust scores for a blockchain address based on the scoring features associated with the blockchain address. The scoring features can be numerical values (e.g., integer or decimal values), Boolean values (e.g., 0/1), enumerated values, or other values.

The feature generation module 30006 can generate the scoring features based on any of the blockchain values described herein. For example, scoring features for a blockchain address may be based on 1) amounts associated with transactions, 2) timing data associated with transactions (e.g., dormancy), 3) graph-based values (e.g., one or more importance values) associated with the blockchain address, and/or 4) behavior-based data associated with the blockchain address.

With respect to behavior-based data, the feature generation module 30006 may generate a Boolean scoring feature that indicates whether the blockchain address matches any of the behavior templates. In another example, the feature generation module 30006 may generate a Boolean scoring feature for each of the behavior templates, such that the scoring features identify which of the behavior templates are matched. In another example, the feature generation module 30006 may generate a scoring feature that indicates how many of the behavior templates were matched (e.g., a percentage of the total available). In another example, instead of generating Boolean features, the feature generation module 30006 may generate numeric values that indicate how well the blockchain address matched the behavior templates, such as a decimal value (e.g., 0.00-1.00) that indicates how well the behavior template was matched.

The trust module 29500 includes a scoring model generation module 30008 (referred to herein as a "model generation module 30008") that can generate scoring models 1600 that are used to generate local trust scores for a blockchain address. For example (e.g., see FIG. 319), a scoring model can receive scoring features for a blockchain address and output a local trust score for the blockchain address. The model generation module 30008 can generate a scoring model based on training data. The training data can include scoring features along with associated fraud labels. The set of scoring features a model uses as input may be referred to herein as a "feature vector." In some implementations, the trust module 29500 can use a deep neural net to score, where the classification is determined by known good/bad addresses. The neural net may be trained over the feature vectors. In some implementations, the trust module 29500 can leverage models based on random forests, decision trees, and logistic regression, and combine them in the form of a "consensus of experts."

The model generation module 30008 can generate a scoring model (e.g., a machine learned model) based on training data that includes sets of feature vectors and their corresponding fraud label (e.g., Fraud: 0/1). In this example, the generated scoring model may output a local trust score (e.g., a decimal value) that indicates the likelihood the blockchain address is fraudulent. In some implementations, the training data may also include a label that positively indicates that the blockchain address is a known good address (e.g., not fraudulent).

Although the trust module 29500 can generate scoring models that are used to generate local trust scores, the trust module 29500 may generate local trust scores in other manners. For example, the trust module 29500 may generate local trust scores using scoring functions (e.g., weighted scoring functions) and/or heuristic models that generate local trust scores according to rules.

FIG. 319 illustrates an example score generation module 30016 that generates local trust scores for blockchain addresses. The score generation module 30016 may generate a local trust score for a blockchain address by using a feature vector for the blockchain address and a scoring model. For example, the score generation module 30016 may input a feature vector for a blockchain address into a scoring model that outputs a local trust score.

The local trust score 29508 for a blockchain address can be stored in the blockchain address record 29504. The score generation module 30016 can generate local trust scores for each of the blockchain addresses. The score generation module 30016 can also update the local trust scores over time, such as when additional data is acquired. A blockchain address record 29504 can include the most recently calculated local trust score, as well as historically calculated local trust scores. In some implementations, the trust module 29500 can leverage the change in local trust score (and historical score) to provide a real-time alerting system, such that a party can be notified if the trust score of an address drops (e.g., as in the case of an organization receiving fraudulent funds through an address they control). The trust module 29500 may provide an API that can hook into their service that can freeze the transaction and alert the relevant people at that organization (e.g., by phone, email, etc.).

The score generation module 30016 may be configured to provide the local trust score in a variety of formats. In some implementations, the local trust score may be an integer value with a minimum and maximum value. For example, the local trust score may range from 1-7, where a trust score of '1' indicates that the blockchain address is likely fraudulent. In this example, a trust score of '7' may indicate that the blockchain address is not likely fraudulent (i.e., very trustworthy). In some implementations, the local trust score may be a decimal value. For example, the local trust score may be a decimal value that indicates a likelihood of fraud (e.g., a percentage value from 0-100%). In some implementations, a local trust score may range from a maximum negative value to a maximum positive value (e.g., −1.00 to 1.00), where a larger negative value indicates that the address is more likely fraudulent. In this example, a larger positive value may indicate that the address is more likely trustworthy. The customer may select the trust score format they prefer.

In some implementations, the blockchain address record 29504 can store request data 30028 for each trust request. The request data 30028 may include any data associated with a received trust request and/or the provided trust response. The request data 30028 may be stored in the associated blockchain address record 29504. In some implementations, a blockchain address record may store request data 30028 each time a trust request is made for the blockchain address. In these implementations, the request data 30028 may indicate a number of times a trust request was made for the blockchain address. The request data 30028 may also indicate the blockchain address that made the trust request, the consensus trust score that was reported to the requestor, and the time of the request. Accordingly, the request data 30028 may show trends over time regarding the parties that are requesting trust scores for a blockchain address. In some implementations, the scoring features for a blockchain address may include scoring features that are based on the request data 30028. One example scoring feature may be a total number of times a trust request was made for the blockchain address. Another example scoring feature may be a number of different blockchain addresses that made trust requests for the blockchain address. Other example features may include the frequency at which trust requests were made for the blockchain address (e.g., a number of requests over a time period).

Although the trust module 29500 may calculate a single local trust score for each of the blockchain addresses, regardless of whether the blockchain address is a sender or receiver, in some implementations, the trust module 29500 may calculate a receiver trust score and a sender trust score for each address. In one example, a blockchain address which regularly falls prey to scams can have the sender trust score set as less trustworthy than a blockchain address which does not often fall prey to scams. In another example, a blockchain address which regularly falls prey to phishing scams may not have a modified receiver trust score when there is no indication of nefarious activity associated with receiving funds at the blockchain address.

FIGS. 320-328 are directed to an environment in which a cryptocurrency blockchain network 30070 can execute smart contracts provided by a trust network 30072-1 (e.g., including trust nodes 30072-1*a*, 30072-1*b*, . . . , 30072-1N) or a centralized trust system 30072-2 (e.g., see FIG. 320 and FIG. 323). For example, the blockchain network 30070 may provide a virtual machine 30074 (VM) (e.g., a decentralized virtual machine) that executes the smart contracts. The smart contracts described herein can include a variety of functionality. For example, a smart contract may request a trust score for a potential receiver address from the trust network/system 30072 and then complete or cancel a blockchain transaction based on the trustworthiness of the receiver address. Using smart contracts according to FIGS. 320-328 provides for the acquisition of trust scores using the native cryptocurrency of the blockchain network 30070 (e.g., cryptocurrency blockchain tokens) instead of using UTOKEN.

FIG. 320 illustrates an environment that includes a cryptocurrency blockchain network 30070 that executes smart contracts. The cryptocurrency blockchain network 30070 may receive the smart contracts from a variety of sources, such as a decentralized trust network 30072-1 or a centralized trust system 30072-2 (hereinafter "trust system 30072-2"). The blockchain network 30070 includes cryptocurrency blockchain protocols 30076 and a cryptocurrency blockchain ledger 30078, as described with respect to FIG. 293. The cryptocurrency blockchain protocols 30076 of FIG. 320 may create virtual machines 30074 (e.g., process virtual machines) that execute the smart contracts 30080. For example, the virtual machines 30074 may execute the smart contracts 30080 on one or more nodes of the blockchain network 30070. An example virtual machine on a blockchain network is the Ethereum Virtual Machine that operates on the Ethereum blockchain.

The distributed trust network 30072-1 of FIG. 320 may provide similar functionality as the trust network 29300 of FIG. 293 described herein. The trust network 30072-1 may also provide functionality associated with the smart contracts. For example, the trust network 30072-1 may provide smart contracts for execution on the blockchain network 30070. In some implementations, the trust network 30072-1 may include smart contract templates 30110 (e.g., see FIG. 323) that may be provided to parties (e.g., exchanges/wallets) for execution on the blockchain network 30070. In some implementations, the trust network 30072-1 may also provide an interface (e.g., an API) for completing smart contract templates with data, such as a sender address, a receiver address, and a specified trust level for transactions. The trust network 30072-1 can also be configured to provide trust scores to smart contracts that are instantiated on the blockchain network 30070. A smart contract may complete or cancel a transaction based on the received trust score.

In some implementations, a party (e.g., a company) may operate a trust system 30072-2 that provides functionality associated with the smart contracts described herein. In some implementations, the same party (e.g., company) can operate one or more nodes on the trust network 30072-1 and also operate a trust system 30072-2. For example, the party may provide different trust nodes/systems for different business partners/customers. In other implementations, different parties (e.g., companies) may operate trust network nodes and one or more trust systems. Furthermore, different trust systems/networks may be implemented for different cryptocurrency blockchain networks.

The trust system 30072-2 can provide similar functionality as the trust network 30072-1. The trust system 30072-2 (e.g., a server) generates trust scores for cryptocurrency transactors (e.g., user devices 29302, intermediate systems 29304, and automated transaction systems 29306). For example, the trust system 30072-2 can generate trust scores for different blockchain addresses that interact on the blockchain network 30070. The trust system 30072-2 may determine the trust scores based on data retrieved from various data sources along with blockchain data upon which the cryptocurrency is based. For example, the trust system 30072-2 can determine trust scores for blockchain transactions in a similar manner as described with respect to the trust node 29300-1. A cryptocurrency transactor can request trust scores from the trust system 30072-2 before engaging in a blockchain transaction in which funds (e.g., blockchain tokens) are transacted on the blockchain.

FIG. 323 illustrates an example trust system 30072-2 that can determine trust scores for blockchain addresses. The trust system 30072-2 of FIG. 323 includes modules that perform similar functions as described with respect to the trust node 29300-1. The detailed example trust system 30072-2 of FIG. 323 is only an example trust system. As such, a trust system may include additional/alternative functionality than that illustrated in FIG. 323.

The data acquisition and processing module 30112 acquires and processes a variety of types of data, such as custody data and fraud data, which may be stored in the trust system data store 30111. The data acquisition and processing module 30112 may also generate a fraud label that indicates whether the blockchain address is likely fraudulent based on the acquired fraud data. The blockchain acquisition and processing module 30114 acquires and processes blockchain data that may be stored in the trust system data store 30111. The trust system data store 30111 may also include a plurality blockchain address records. The graph generation and processing module 30116 generates a blockchain graph data structure based on the blockchain data. The graph generation data structure may be stored in the graph data store 30113. The graph generation and processing module 30116 may also process the graph to determine one or more graph-based values (e.g., importance values) that may be used to generate trust scores. The feature generation module 30118 generates scoring features for blockchain addresses. The scoring model generation module 30120 generates one or more scoring models based on the scoring features and other data (e.g., labeled fraud data). The scoring models may be stored in the scoring model data store 30115. The trust score generation module 30122 generates one or more trust scores for blockchain addresses using one or more scoring models and the scoring features associated with the blockchain addresses.

The trust system 30072-2 includes a transactor interface module 30124 that receives a trust request for a blockchain address from a requesting device. The trust request may refer to a request other than a contract trust request. The transactor interface module 30124 sends a trust response including a trust score to the requesting device.

As described with respect to the trust network 30072-1, the trust system 30072-2 can also provide smart contract templates 30110 and completed smart contracts to requesting parties for execution on the blockchain network 30070. Additionally, the trust system 30072-2 can also be configured to provide trust scores to smart contracts instantiated on the blockchain network 30070.

FIG. 321 illustrates a method that describes operation of the environment of FIG. 320. FIG. 322 is a functional block diagram that illustrates interactions between a sender user device 29302, an intermediate transaction system 29304 (e.g., an exchange or centralized wallet system) (hereinafter "intermediate system 29304"), the blockchain network 30070, and the trust network/system 30072 according to FIG. 321. FIGS. 323-324 illustrate an example trust system 30072-2 and trust node 30072-1*a* that implement functionality associated with the smart contracts. For example, FIGS. 323-324 illustrate contract distribution modules 30130-1, 30130-2, contract template data stores 30132-1, 30132-2, and contract interface modules 30134-1, 30134-2 that implement functionality associated with smart contracts.

The method of FIG. 321 is now described with respect to FIGS. 322-326. In block 30090, a smart contract template 30110 is provided by the trust network/system 30072 for completion and distribution. The contract distribution modules 30130 and contract template data stores 30132 provide the smart contract completion and distribution functionality for the trust system 30072-2 and trust node 30072-1*a*. The contract template data stores 30132 store smart contract templates. The contract distribution modules 30130 provide an interface (e.g., an API) that a party (e.g., an exchange) can use to modify/complete the smart contract template 30110 and acquire the completed smart contract for instantiation on the blockchain network 30070. In the trust network 30072-1, smart contract template storage, smart contract generation, and smart contract distribution may be decentralized across the plurality of trust nodes. The trust node 30072-1*a* of FIG. 324 is an example trust node. As such, trust nodes may include additional and/or alternative functionality (e.g., see FIG. 303).

Referring to FIG. 323, a smart contract template 30110 can include smart contract code 30140 that executes on the blockchain network 30070. The smart contract code 30140 may include computer-readable instructions that may be executed by one or more processing units. Smart contracts may be written in one or more languages and compiled into bytecode that is deployed on the blockchain network 30070 for execution. With respect to the Ethereum blockchain, a smart contract can be written in one or more programming languages (e.g., Solidity) and compiled into Ethereum Virtual Machine bytecode for deployment on the Ethereum blockchain. The smart contract code can be executed on the blockchain network 30070 to implement the functionality attributed to the smart contracts herein. For example, the smart contract code 30140 can include a series of rules (e.g., business rules) that are run on the blockchain network 30070. Example functionality executed by the smart contract code 30140 may include, but is not limited to: 1) generating a contract trust request, 2) receiving a trust score, 3) determining whether the trust score indicates a receiver is trustworthy, and 4) completing/canceling a transaction based on the trust score. Since the smart contracts may be implemented on a blockchain network, the smart contracts may also be referred to as "blockchain smart contracts" or "decentralized blockchain-based smart contracts."

A smart contract template 30140 may include fields for receiving values that can complete the smart contract template 30140. The intermediate system 29304 (e.g., an exchange) can provide the values for completing the fields in the smart contract. Example smart contract fields may include, but are not limited to: 1) a contract trust threshold field 30142, 2) a sender address field 30144, 3) a receiver address field 30146, 4) a transaction amount field 30148, 5) a trust fee field 30140, and 6) a trust fee payment address 30142. A sender transactor can provide some/all of the values for completing the smart contract to the intermediate system 29304 (e.g., see FIG. 325). The contract distribution modules 30130 can complete the smart contract templates according to the values received from the intermediate system 29304. The intermediate system 29304 can instantiate the completed smart contract on the blockchain network 30070.

In block 30092, the sender transactor is provided with an interface for arranging a transaction with a receiver address. For example, the intermediate system 29304 (e.g., an exchange) can provide a user interface (e.g., a GUI) for the sender transactor to set up a trust-protected transaction with a receiver. The interface can receive a sender's inputs for setting up and completing the transaction. For example, the interface can include GUI elements for receiving one or more addresses, coin amounts, and a specified contract trust threshold. In some implementations, the trust system/node administrator can work with parties (e.g., exchanges/wallets) to build an interface (e.g., an exchange/wallet interface).

FIGS. 325-326 illustrate an example sender interface on a user device 29302. The sender interface allows the sender to specify a transaction amount (e.g., 5 coins) to send to a receiver address. In FIG. 325, the GUI includes GUI elements that the sender can use to select whether to use trust protection. The example GUI elements are radio buttons that provide the user with a yes/no selection. If a trust-protected transaction is selected, there is a GUI element that can receive a user-specified level of trust for the transaction. For example, the sender may select the low, medium, or high GUI buttons to select a low, medium, or high risk level for the transaction. In FIG. 325, the user has selected the medium level of trust, as indicated by the darkened "Med." GUI element. The selectable risk levels may correspond to contract trust threshold values. For example, the low risk level may require a higher trust score (e.g., a greater trustworthiness) for completion of the transaction than the medium and high risk levels. In some implementations, the intermediate system 29304 may include a preset contract trust threshold (e.g., set by an exchange) instead of providing the user with a GUI element for selecting the risk level. In some implementations, the smart contract template 30110 may include a preset contract trust threshold.

The GUI of FIG. 325 provides a summary of the total amount for the trust-protected transaction. For example, the GUI indicates the trust fee and the network fee for the trust report and the contract execution, respectively. The GUI includes a "Send Coins" button GUI element that the user can select to begin the transaction according to the smart contract. FIG. 326 illustrates an example GUI provided by the intermediate system 29304 that indicates the transaction was completed. The GUIs illustrate in FIGS. 325-326 may be provided by the intermediate system 29304 (e.g., via a web-based interface) and/or an application installed on the user device 29302.

In block 30094, the smart contract is generated according to the sender's input and instantiated on the blockchain network 30070. For example, the intermediate system 29304 can send the values entered into the sender interface (e.g., see FIG. 325) to the contract distribution modules 30130. The contract distribution modules 30130 can generate a completed contract using the received values and a smart contract template 30110. The contract distribution modules 30130 can send the completed contract to the intermediate system 29304. The intermediate system 29304 can then instantiate the smart contract on the blockchain network 30070.

The intermediate system 29304 may instantiate the smart contract with different completed fields. For example, the intermediate system 29304 can instantiate the smart contract with a specified contract trust threshold in some implementations. In another example, the intermediate system 29304 can instantiate the smart contract without a specified contract trust threshold. In this example, the contract trust threshold value may be sent to the contract (e.g., by the intermediate system 29304) after the smart contract is instantiated on the blockchain network 30070. In a similar manner, the intermediate system 29304 may include any values described herein in the instantiated smart contract or may provide any of the values after instantiation of the smart contract. The number of defined values included in the smart contract can vary based on the implementation chosen by the operators of the intermediate system 29304 and/or the capabilities of the blockchain network 30070. It can be assumed hereinafter that a completed smart contract includes values for the contract trust threshold, sender address, receiver address, transaction amount, trust fee, and trust fee payment address.

Other smart contract implementations may vary based on decisions made by the operator of the intermediate system 29304 and/or the capabilities of the blockchain network 30070. For example, instead of retrieving a new smart contract for each transaction and completing the smart contract, in some cases, a smart contract may remain on the blockchain network and run subsequent transactions based on newly received values (e.g., new receiver addresses and transaction amounts). In some cases, an intermediate system may retrieve a single version of the smart contract from the trust network/system and modify it for multiple transactions.

In some implementations, the sender pays a network fee in order to instantiate a smart contract on the blockchain network 30070. In these implementations, the network fee may be paid from the sender address to instantiate the smart contract. The blockchain network 30070 may begin execution of the smart contract after payment of the network fee. The network fee may be referred to as "gas" in some cases. In some implementations, the network fee may be set by the blockchain network 30070. Over time, the blockchain network 30070 may modify the network fee. Although a sender address may pay the network fee for instantiation and execution of the smart contract, in some implementations, the network fee may be paid for by an existing intermediate system address.

The instantiated smart contract 30080 is associated with a smart contract address on the blockchain network 30070. The sender funds (e.g., transaction amount and trust fee amount) may be transferred to the contract blockchain address when the smart contract is instantiated. The smart contract 30080 can hold the funds and distribute the funds according to the smart contract 30080 described herein. The intermediate system 29304 may send the instantiated contract address to the trust network/system 30072. The trust network/system 30072 can monitor the instantiated contract address to verify trust fee payments and monitor the blockchain ledger 30078 for a contract trust request.

As described herein, the trust network/system 30072 may receive trust fee payments for providing trust reports. With respect to trust reports provided to the smart contract 30080, the trust network/system 30072 may receive payments at a trust fee payment address on the blockchain network 30070. The trust fee payment address may be controlled by the trust network/system 30072. The contract address may pay the trust fee using the blockchain's native tokens, referred to herein as cryptocurrency blockchain tokens. In some implementations, the trust network/system 30072 can include one or more blockchain addresses for receiving trust fee payments. The trust network/system 30072 can acquire one or more trust fee payments from the trust fee payment address. For the trust system 30072-2, the trust fee may be set/modified by the operator of the trust system 30072-2. For the trust network 30072-1, the reward protocol can set/modify the trust fee.

In block 30096, the smart contract 30080 acquires a trust score from the trust network/system 30072. To acquire a trust score, the smart contract 30080 may generate a contract trust request for the receiver address. The contract trust request may be a request for a trust report for the receiver address (e.g., one or more trust scores for the receiver address). The smart contract 30080 can generate the contract trust request in a variety of ways. In some implementations, the smart contract 30080 can write the contract trust request to a ledger (e.g., the blockchain ledger 30078) under the contract address. The contract trust request can include a code written to the ledger 30078 that identifies the ledger entry as a contract trust request for the trust network/system 30072. Additionally, the contract trust request may indicate the receiver address for which the trust report is requested. Although the smart contract 30080 may write the trust request to the ledger 30078, in some implementations, the smart contract 30080 may be configured to send requests to the trust network/system 30072 (e.g., via an API) if the blockchain network 30070 supports the functionality.

The trust network/system 30072 (e.g., the contract interface modules 30134) may be configured to scan the blockchain ledger 30078 to identify contract trust requests made by smart contracts 30080. In implementations where the contract address is reported to the trust network/system 30072 (e.g., by the intermediate system 29304), the trust network/system 30072 may be configured to scan the reported contract addresses for contract trust requests.

In some implementations, prior to providing the trust score to the smart contract 30080, the trust network/system 30072 determines whether the trust fee has been paid. The trust network/system 30072 (e.g., the contract interface modules 30134) can scan the blockchain ledger 30078 to determine whether the trust fee has been paid. For example, the trust network/system 30072 may determine that the trust fee has been paid by identifying a transaction between the contract address and the trust fee payment address for the trust fee amount.

After identification of the contract trust request and verification of the trust fee payment, the trust network/system 30072 (e.g., the contract interface modules 30134) may identify/calculate the trust score(s) for the receiving address indicated in the contract trust request. The trust network/system 30072 may then send the trust score to the smart contract 30080. Inputting data into a smart contract may vary based on the blockchain network. For example, on the Ethereum network, data may be input into the smart contract according to the Ethereum Request for Comments (ERC) technical standard.

In block 30098, the smart contract 30080 determines whether the receiver is trustworthy based on the received trust score. In some implementations, the smart contract 30080 may compare the received trust score to the contract trust threshold to determine whether the receiver is trustworthy. For example, where a larger trust score indicates a more trustworthy address, the smart contract 30080 may determine that the receiver address is trustworthy when the received trust score is greater than the contract trust threshold. In this example, the smart contract 30080 may determine that the receiver address is not sufficiently trustworthy when the received trust score is less than the contract trust threshold. In a specific example, where the trust score is a decimal value that indicates a likelihood of fraud (e.g., a percentage value from 0-100%), an example contract trust threshold may be set to 0.35 (i.e., 35%). As described herein, in some implementations, a trust score may range from a maximum negative value to a maximum positive value (e.g., −1.00 to 1.00), where a larger negative value indicates that the address is more likely fraudulent. In this specific example, a contract trust threshold may be set somewhere in the range of −1.00 to 1.00.

If the smart contract 30080 determines that the receiver address is trustworthy in block 30098, the smart contract 30080 sends the transaction amount to the receiver address in block 30100. If the smart contract 30080 determines that the receiver address is not trustworthy in block 30098, the smart contract 30080 sends the transaction amount back to the sender address in block 30102.

In block 30104, a transaction report is sent to the sender that summarizes the transaction. For example, the intermediate system 29304 may read transaction data from the blockchain network 30070, such as whether the transaction was completed/canceled and the amount of token sent in the transaction. The intermediate system 29304 may then generate a transaction report for the sender user device 29302. An example transaction report is illustrated in FIG. 326. The transaction report of FIG. 326 indicates that the transaction was completed because the receiver address was sufficiently trustworthy.

FIG. 327 illustrates an example method describing operation of the intermediate system 29304 of FIG. 320. In block 30150, the intermediate system 29304 generates an interface (e.g., a web-based GUI) for the sender user device 29302. In block 30152, the intermediate system 29304 receives contract values from the sender user device 29302, such as values inserted into the interface. In block 30154, the intermediate system 29304 retrieves a smart contract that was completed by the trust network/system 30072 based on the contract values.

In block 30156, the intermediate system 29304 instantiates the completed smart contract on the blockchain network 30070. In block 30158, the intermediate system 29304 reports the smart contract address to the trust network/system 30072. In block 30160, the intermediate system 29304 generates a transaction report for the sender based on the completion/cancellation of the transaction associated with the instantiated smart contract.

FIG. 328 illustrates an example method describing operation of the trust network/system 30072 of FIG. 320. In block 30180, the trust network/system 30072 receives contract values for a smart contract template from the intermediate system 29304. In block 30182, the trust network/system 30072 generates a completed smart contract based on the received contract values. In block 30184, the trust network/system 30072 sends the completed smart contract to the intermediate system 29304.

In block 30186, the trust network/system 30072 receives a contract address from the intermediate system 29304 for the instantiated smart contract. In block 30188, the trust network/system 30072 monitors the blockchain ledger 30078 for a trust fee payment. In block 30190, the trust network/system 30072 monitors the blockchain ledger 30078 for a contract trust request associated with the contract address. In block 30192, the trust network/system 30072 sends a trust score for the receiver address to the smart contract.

Modules and data stores included in the trust networks/systems represent features that may be included in the trust networks/systems of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provide communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the trust networks/systems may include one or more computing devices (e.g., node computing/server devices) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the trust networks/systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices may reside within a single machine at a single geographic location in some examples. In other examples, the one or more computing devices may reside within multiple machines at a single geographic location. In still other examples, the one or more computing devices of the trust networks/systems may be distributed across a number of geographic locations.

Dual Process Artificial Neural Network

In embodiments, the platform 100 includes a dual process artificial neural network (DPANN) system 32900. The DPANN system 32900 includes an artificial neural network (ANN) having behaviors and operational processes (such as decision-making) that are products of a training system and a retraining system. The training system is configured to perform automatic, trained execution of ANN operations. The retraining system performs effortful, analytical, intentional retraining of the ANN, such as based on one or more relevant aspects of the ANN, such as memory, one or more input data sets (including time information with respect to elements in such data sets), one or more goals or objectives (including ones that may vary dynamically, such as periodically and/or based on contextual changes, such as ones relating to the usage context of the ANN), and/or others. In cases involving memory-based retraining, the memory may include original/historical training data and refined training data. The DPANN system 32900 includes a dual process learning function (DPLF) configured to manage and perform an ongoing data retention process. The DPLF (including, where applicable, memory management process) facilitate retraining and refining of behavior of the ANN. The DPLF provides a framework by which the ANN creates outputs such as predictions, classifications, recommendations, conclusions and/or other outputs based on a historic inputs, new inputs, and new outputs (including outputs configured for specific use cases, including ones determined by parameters of the context of utilization (which may include performance parameters such as latency parameters, accuracy parameters, consistency parameters, bandwidth utilization parameters, processing capacity utilization parameters, prioritization parameters, energy utilization parameters, and many others).

In embodiments, the DPANN system 32900 stores training data, thereby allowing for constant retraining based on results of decisions, predictions, and/or other operations of the ANN, as well as allowing for analysis of training data upon the outputs of the ANN. The management of entities stored in the memory allows the construction and execution of new models, such as ones that may be processed, executed or otherwise performed by or under management of the training system. The DPANN system 32900 uses instances of the memory to validate actions (e.g., in a manner similar to the thinking of a biological neural network (including retrospective or self-reflective thinking about whether actions that were undertaken under a given situation where optimal) and perform training of the ANN, including training that intentionally feeds the ANN with appropriate sets of memories (i.e., ones that produce favorable outcomes given the performance requirements for the ANN).

In embodiments, the DPLF may be or include the continued process retention of one or more training datasets and/or memories stored in the memory over time. The DPLF thereby allows the ANN to apply existing neural functions and draw upon sets of past events (including ones that are intentionally varied and/or curated for distinct purposes), such as to frame understanding of and behavior within present, recent, and/or new scenarios, including in simulations, during training processes, and in fully operational deployments of the ANN. The DPLF may provide the ANN with a framework by which the ANN may analyze, evaluate, and/or manage data, such as data related to the past, present and future. As such, the DPLF plays a crucial role in training and retraining the ANN via the training system and the retraining system.

In embodiments, the DPLF is configured to perform a dual-process operation to manage existing training processes and is also configured to manage and/or perform new training processes, i.e., retraining processes. In embodiments, each instance of the ANN is trained via the training system and configured to be retrained via the retraining system. The ANN encodes training and/or retraining datasets, stores the datasets, and retrieves the datasets during both training via the training system and retraining via the retraining system. The DPANN system 32900 may recognize whether a dataset (the term dataset in this context optionally including various subsets, supersets, combinations, permutations, elements, metadata, augmentations, or the like, relative to a base dataset used for training or retraining), storage activity, processing operation and/or output, has characteristics that natively favor the training system versus the retraining system based on its respective inputs, processing (e.g., based on its structure, type, models, operations, execution environment, resource utilization, or the like) and/or outcomes (including outcome types, performance requirements (including contextual or dynamic requirements), and the like. For example, the DPANN system 32900 may determine that poor performance of the training system on a classification task may indicate a novel problem for which the training of the ANN was not adequate (e.g., in type of data set, nature of input models and/or feedback, quantity of training data, quality of tagging or labeling, quality of supervision, or the like), for which the processing operations of the ANN are not well-suited (e.g., where they are prone to known vulnerabilities due to the type of neural network used, the type of models used, etc.), and that may be solved by engaging the retraining system to retrain the model to teach the model to learn to solve the new classification problem (e.g., by feeding it many more labeled instances of correctly classified items). With periodic or continuous evaluation of the performance of the ANN, the DPANN system may subsequently determine that highly stable performance of the ANN (such as where only small improvements of the ANN occur over many iterations of retraining by the retraining system) indicates readiness for the training system to replace the retraining system (or be weighted more favorably where both are involved). Over longer periods of time, cycles of varying performance may emerge, such as where a series of novel problems emerge, such that the retraining system of the DPANN is serially engaged, as needed, to retrain the ANN and/or to augment the ANN by providing a second source of outputs (which may be fused or combined with ANN outputs to provide a single result (with various weightings across them), or may be provided in parallel, such as enabling comparison, selection, averaging, or context- or situation-specific application of the respective outputs).

In embodiments, the ANN is configured to learn new functions in conjunction with the collection of data according to the dual-process training of the ANN via the training system and the retraining system. The DPANN system 32900 performs analysis of the ANN via the training system and performs initial training of the ANN such that the ANN gains new internal functions (or internal functions are subtracted or modified, such as where existing functions are not contributing to favorable outcomes). After the initial training, the DPANN system 32900 performs retraining of the ANN via the retraining system. To perform the retraining, the retraining system evaluates the memory and historic processing of the ANN to construct targeted DPLF processes for retraining. The DPLF processes may be specific to identified scenarios. The ANN processes can run in parallel with the DPLF processes. By way of example, the ANN may function to operate a particular make and model of a self-driving car after the initial training by the training system. The DPANN system 32900 may perform retraining of the functions of the ANN via the retraining system, such as to allow the ANN to operate a different make and model of car (such as one with different cameras, accelerometers and other sensors, different physical characteristics, different performance requirements, and the like), or even a different kind of vehicle, such as a bicycle or a spaceship.

In embodiments, as quality of outputs and/or operations of the ANN improves, and as long as the performance requirements and the context of utilization for the ANN remain fairly stable, performing the dual-process training process can become a decreasingly demanding process. As such, the DPANN system 32900 may determine that fewer neurons of the ANN are required to perform operations and/or processes of the ANN, that performance monitoring can be less intensive (such as with longer intervals between performance checks), and/or that the retraining is no longer necessary (at least for a period of time, such as until a long-term maintenance period arrives and/or until there are significant shifts in context of utilization). As the ANN continues to improve upon existing functions and/or add new functions via the dual-process training process, the ANN may perform other, at times more "intellectually-demanding" (e.g., retraining intensive) tasks simultaneously. For example, utilizing dual process-learned knowledge of a function or process being trained, the ANN can solve an unrelated complex problem or make a retraining decision simultaneously. The retraining may include supervision, such as where an agent (e.g., human supervisor or intelligent agent) directs the ANN to a retraining objective (e.g., "master this new function") and provides a set of training tasks and feedback functions (such as supervisory grading) for the retraining. In-embodiments, the ANN can be used to organize the supervision, training and retraining of other dual process-trained ANNs, to seed such training or retraining, or the like.

In embodiments, one or more behaviors and operational processes (such as decision-making) of the ANN may be products of training and retraining processes facilitated by the training system and the retraining system, respectively. The training system may be configured to perform automatic training of ANN, such as by continuously adding additional instances of training data as it is collected by or from various data sources. The retraining system may be configured to perform effortful, analytical, intentional retraining of the ANN, such as based on memory (e.g., stored training data or refined training data) and/or optionally based on reasoning or other factors. For example, in a deployment management context, the training system may be associated with a standard response by the ANN, while the retraining system may implement DPLF retraining and/or network adaptation of the ANN. In some cases, retraining of the ANN beyond the factory, or "out-of-the-box," training level may involve more than retraining by the retraining system. Successful adjustment of the ANN by one or more network adaptations may be dependent on the operation of one or more network adjustments of the training system.

In embodiments, the training system may facilitate fast operating by and training of the ANN by applying existing neural functions of the ANN based on training of the ANN with previous datasets. Standard operational activities of the ANN that may draw heavily on the training system may include one or more of the methods, processes, workflows, systems, or the like described throughout this disclosure and the documents incorporated herein, such as, without limitation: defined functions within networking (such as discovering available networks and connections, establishing connections in networks, provisioning network bandwidth among devices and systems, routing data within networks, steering traffic to available network paths, load balancing across networking resources, and many others); recognition and classification (such as of images, text, symbols, objects, video content, music and other audio content, speech content, and many others); spoken words; prediction of states and events (such as prediction of failure modes of machines or systems, prediction of events within workflows, predictions of behavior in shopping and other activities, and many others); control (such as controlling autonomous or semi-autonomous systems, automated agents (such as automated call-center operations, chat bots, and the like) and others); and/or optimization and recommendation (such as for products, content, decisions, and many others). ANNs may also be suitable for training datasets for scenarios that only require output. The standard operational activities may not require the ANN to actively analyze what is being asked of the ANN beyond operating on well-defined data inputs, to calculate well-defined outputs for well-defined use cases. The operations of the training system and/or the retraining system may be based on one or more historic data training datasets and may use the parameters of the historic data training datasets to calculate results based on new input values and may be performed with small or no alterations to the ANN or its input types. In embodiments, an instance of the training system can be trained to classify whether the ANN is capable of performing well in a given situation, such as by recognizing whether an image or sound being classified by the ANN is of a type that has historically been classified with a high accuracy (e.g., above a threshold).

In embodiments, network adaptation of the ANN by one or both of the training system and the retraining system may include a number of defined network functions, knowledge, and intuition-like behavior of the ANN when subjected to new input values. In such embodiments, the retraining system may apply the new input values to the DPLF system to adjust the functional response of the ANN, thereby performing retraining of the ANN. The DPANN system 32900 may determine that retraining the ANN via network adjustment is necessary when, for example, without limitation, functional neural networks are assigned activities and assignments that require the ANN to provide a solution to a novel problem, engage in network adaptation or other higher-order cognitive activity, apply a concept outside of the domain in which the DPANN was originally designed, support a different context of deployment (such as where the use case, performance requirements, available resources, or other factors have changed), or the like. The ANN can be trained to recognize where the retraining system is needed, such as by training the ANN to recognize poor performance of the training system, high variability of input data sets relative to the historical data sets used to train the training system, novel functional or performance requirements, dynamic changes in the use case or context, or other factors. The ANN may apply reasoning to assess performance and provide feedback to the retraining system. The ANN may be trained and/or retrained to perform intuitive functions, optionally including by a combinatorial or re-combinatorial process (e.g., including genetic programming wherein inputs (e.g., data sources), processes/functions (e.g., neural network types and structures), feedback, and outputs, or elements thereof, are arranged in various permutations and combinations and the ANN is tested in association with each (whether in simulations or live deployments), such as in a series of rounds, or evolutionary steps, to promote favorable variants until a preferred ANN, or preferred set of ANNs is identified for a given scenario, use case, or set of requirements). This may include generating a set of input "ideas" (e.g., combinations of different conclusions about cause-and-effect in a diagnostic process) for processing by the retraining system and subsequent training and/or by an explicit reasoning process, such as a Bayesian reasoning process, a casuistic or conditional reasoning process, a deductive reasoning process, an inductive reasoning process, or others (including combinations of the above) as described in this disclosure or the documents incorporated herein by reference.

Referring to FIG. 329, in embodiments, the DPLF may perform an encoding process of the DPLF to process datasets into a stored form for future use, such as retraining of the ANN by the retraining system. The encoding process enables datasets to be taken in, understood, and altered by the DPLF to better support storage in and usage from the memory. The DPLF may apply current functional knowledge and/or reasoning to consolidate new input values. In the example provided, data is taken in as data input 32902. The memory can include short-term memory (STM) 32904, long-term memory (LTM) 32906, or a combination thereof. The datasets may be stored in one or both of the STM and the LTM. The STM may be implemented by the application of specialized behaviors inside the ANN (such as recurrent neural network, which may be gated or un-gated, or long-term short-term neural networks). The LTM may be implemented by storing scenarios, associated data, and/or unprocessed data that can be applied to the discovery of new scenarios. The encoding process may include processing and/or storing, for example, visual encoding data (e.g., processed through a Convolution Neural Network), acoustic sensor encoding data (e.g., how something sounds, speech encoding data (e.g., processed through a deep neural network (DNN), optionally including for phoneme recognition), semantic encoding data of words, such to determine semantic meaning, e.g., by using a Hidden Markov Model (HMM); and/or movement and/or tactile encoding data (such as operation on vibration/accelerometer sensor data, touch sensor data, positional or geolocation data, and the like). While datasets may enter the DPLF system through one of these modes, the form in which the datasets are stored may differ from an original form of the datasets and may pass-through neural processing engines to be encoded into compressed and/or context-relevant format. For example, an unsupervised instance of the ANN can be used to learn the historic data into a compressed format.

In embodiments, the encoded datasets are retained within the DPLF system. Encoded datasets are first stored in short-term DPLF, i.e., STM. For example, sensor datasets may be primarily stored in STM, and may be kept in STM through constant repetition. The datasets stored in the STM are active and function as a kind of immediate response to new input values. The DPANN system 32900 may remove datasets from STM in response to changes in data streams due to, for example, running out of space in STM as new data is imported, processed and/or stored. For example, it is viable for short-term DPLF to only last between 15 and 30 seconds. STM may only store small amounts of data typically embedded inside the ANN.

In embodiments, the DPANN system 32900 may measure attention based on utilization of the training system, of the DPANN system 32900 as a whole, and/or the like, such as by consuming various indicators of attention to and/or utilization of outputs from the ANN and transmitting such indicators to the ANN in response (similar to a "moment of recognition" in the brain where attention passes over something and the cognitive system says "aha!"). In embodiments, attention can be measured by the sheer amount of the activity of one or both of the systems on the data stream. In embodiments, a system using output from the ANN can explicitly indicate attention, such as by an operator directing the ANN to pay attention to a particular activity (e.g., to respond to a diagnosed problem, among many other possibilities). The DPANN system 32900 may manage data inputs to facilitate measures of attention, such as by prompting and/or calculating greater attention to data that has high inherent variability from historical patterns (e.g., in rates of change, departure from norm, etc.), data indicative of high variability in historical performance (such as data having similar characteristics to data sets involved in situations where the ANN performed poorly in training), or the like.

In embodiments, the DPANN system 32900 may retain encoded datasets within the DPLF system according to and/or as part of one or more storage processes. The DPLF system may store the encoded datasets in LTM as necessary after the encoded datasets have been stored in STM and determined to be no longer necessary and/or low priority for a current operation of the ANN, training process, retraining process, etc. The LTM may be implemented by storing scenarios, and the DPANN system 32900 may apply associated data and/or unprocessed data to the discovery of new scenarios. For example, data from certain processed data streams, such as semantically encoded datasets, may be primarily stored in LTM. The LTM may also store image (and sensor) datasets in encoded form, among many other examples.

In embodiments, the LTM may have relatively high storage capacity, and datasets stored within LTM may, in some scenarios, be effectively stored indefinitely. The DPANN system 32900 may be configured to remove datasets from the LTM, such as by passing LTM data through a series of memory structures that have increasingly long retrieval periods or increasingly high threshold requirements to trigger utilization (similar to where a biological brain "thinks very hard" to find precedent to deal with a challenging problem), thereby providing increased salience of more recent or more frequently used memories while retaining the ability to retrieve (with more time/effort) older memories when the situation justifies more comprehensive memory utilization. As such, the DPANN system 32900 may arrange datasets stored in the LTM on a timeline, such as by storing the older memories (measured by time of origination and/or latest time of utilization) on a separate and/or slower system, by penalizing older memories by imposing artificial delays in retrieval thereof, and/or by imposing threshold requirements before utilization (such as indicators of high demand for improved results). Additionally or alternatively, LTM may be clustered according to other categorization protocols, such as by topic. For example, all memories proximal in time to a periodically recognized person may be clustered for retrieval together, and/or all memories that were related to a scenario may be clustered for retrieval together.

In embodiments, the DPANN system 32900 may modularize and link LTM datasets, such as in a catalog, a hierarchy, a cluster, a knowledge graph (directed/acyclic or having conditional logic), or the like, such as to facilitate search for relevant memories. For example, all memory modules that have instances involving a person, a topic, an item, a process, a linkage of n-tuples of such things (e.g., all memory modules that involve a selected pair of entities), etc. The DPANN system 32900 may select sub-graphs of the knowledge graph for the DPLF to implement in one or more domain-specific and/or task-specific uses, such as training a model to predict robotic or human agent behavior by using memories that relate to a particular set of robotic or human agents, and/or similar robotic or human agents. The DPLF system may cache frequently used modules for different speed and/or probability of utilization. High value modules (e.g., ones with high-quality outcomes, performance characteristics, or the like) can be used for other functions, such as selection/training of STM keep/forget processes.

In embodiments, the DPANN system 32900 may modularize and link LTM datasets, such as in various ways noted above, to facilitate search for relevant memories. For example, memory modules that have instances involving a person, a topic, an item, a process, a linkage of n-tuples of such things (such as all memory modules that involve a selected pair of entities), or all memories associated with a scenario, etc., may be linked and searched. The DPANN system 32900 may select subsets of the scenario (e.g., sub-graphs of a knowledge graph) for the DPLF for a domain-specific and/or task-specific use, such as training a model to predict robotic or human agent behavior by using memories that relate to a particular set of robotic or human agents and/or similar robotic or human agents. Frequently used modules or scenarios can be cached for different speed/probability of utilization, or other performance characteristics. High value modules or scenarios (ones where high-quality outcomes results) can be used for other functions, such as selection/training of STM keep/forget processes, among others.

In embodiments, the DPANN system 32900 may perform LTM planning, such as to find a procedural course of action for a declaratively described system to reach its goals while optimizing overall performance measures. The DPANN system 32900 may perform LTM planning when, for example, a problem can be described in a declarative way, the DPANN system 32900 has domain knowledge that should not be ignored, there is a structure to a problem that makes the problem difficult for pure learning techniques, and/or the ANN needs to be trained and/or retrained to be able to explain a particular course of action taken by the DPANN system 32900. In embodiments, the DPANN system 32900 may be applied to a plan recognition problem, i.e., the inverse of a planning problem: instead of a goal state, one is given a set of possible goals, and the objective in plan recognition is to find out which goal was being achieved and how.

In embodiments, the DPANN system 32900 may facilitate LTM scenario planning by users to develop long-term plans. For example, LTM scenario planning for risk management use cases may place added emphasis on identifying extreme or unusual, yet possible, risks and opportunities that are not usually considered in daily operations, such as ones that are outside a bell curve or normal distribution, but that in fact occur with greater-than-anticipated frequency in "long tail" or "fat tail" situations, such as involving information or market pricing processes, among many others. LTM scenario planning may involve analyzing relationships between forces (such as social, technical, economic, environmental, and/or political trends) in order to explain the current situation, and/or may include providing scenarios for potential future states.

In embodiments, the DPANN system 32900 may facilitate LTM scenario planning for predicting and anticipating possible alternative futures along with the ability to respond to the predicted states. The LTM planning may be induced from expert domain knowledge or projected from current scenarios, because many scenarios (such as ones involving results of combinatorial processes that result in new entities or behaviors) have never yet occurred and thus cannot be projected by probabilistic means that rely entirely on historical distributions. The DPANN system 32900 may prepare the application to LTM to generate many different scenarios, exploring a variety of possible futures to the DPLM for both expected and surprising futures. This may be facilitated or augmented by genetic programming and reasoning techniques as noted above, among others.

In embodiments, the DPANN system 32900 may implement LTM scenario planning to facilitate transforming risk management into a plan recognition problem and apply the DPLF to generate potential solutions. LTM scenario induction addresses several challenges inherent to forecast planning. LTM scenario induction may be applicable when, for example, models that are used for forecasting have inconsistent, missing, unreliable observations; when it is possible to generate not just one but many future plans; and/or when LTM domain knowledge can be captured and encoded to improve forecasting (e.g., where domain experts tend to outperform available computational models). LTM scenarios can be focused on applying LTM scenario planning for risk management. LTM scenarios planning may provide situational awareness of relevant risk drivers by detecting emerging storylines. In addition, LTM scenario planning can generate future scenarios that allow DPLM, or operators, to reason about, and plan for, contingencies and opportunities in the future.

In embodiments, the DPANN system 32900 may be configured to perform a retrieval process via the DPLF to access stored datasets of the ANN. The retrieval process may determine how well the ANN performs with regard to assignments designed to test recall. For example, the ANN may be trained to perform a controlled vehicle parking operation, whereby the autonomous vehicle returns to a designated spot, or the exit, by associating a prior visit via retrieval of data stored in the LTM. The datasets stored in the STM and the LTM may be retrieved by differing processes. The datasets stored in the STM may be retrieved in response to specific input and/or by order in which the datasets are stored, e.g., by a sequential list of numbers. The datasets stored in the LTM may be retrieved through association and/or matching of events to historic activities, e.g., through complex associations and indexing of large datasets.

In embodiments, the DPANN system 32900 may implement scenario monitoring as at least a part of the retrieval process. A scenario may provide context for contextual decision-making processes. In embodiments, scenarios may involve explicit reasoning (such as cause-and-effect reasoning, Bayesian, casuistic, conditional logic, or the like, or combinations thereof) the output of which declares what LTM-stored data is retrieved (e.g., a timeline of events being evaluated and other timelines involving events that potentially follow a similar cause-and-effect pattern). For example, diagnosis of a failure of a machine or workflow may retrieve historical sensor data as well as LTM data on various failure modes of that type of machine or workflow (and/or a similar process involving a diagnosis of a problem state or condition, recognition of an event or behavior, a failure mode (e.g., a financial failure, contract breach, or the like), or many others).

FIG. 330 shows a biology based transaction system and FIG. 331 shows a thalamus service 33000 and a set of input sensors streaming data from various sources across a system 33002 with its centrally-managed data sources 33004. The thalamus service 33000 filters the into the control system 33002 such that the control system is never overwhelmed by the total volume of information. In embodiments, the thalamus service 33000 provides an information suppression mechanism for information flows within the system. This mechanism monitors all data streams and strips away irrelevant data streams by ensuring that the maximum data flows from all input sensors are always constrained.

The biology-based transaction system include a PMCP devices interface and the control system 18002. The PMCP devices interface may be associated with a PMCP API, an intelligence system a PMCP controller, classification, behavior analysis, prediction, augmentation, a networking module, a security module, an ETL interface, or a PMCP database. The control system 18002 may include the intelligence service 33010, a quantum computing service, and the intake management system 33006. The intake management system 33006 may include an intake application library with networking and security, an intelligence system, an intake learning module, configured thalamus parameters, the intake controller 33018, and an intake management system with prioritizing, area focus, formatting, filtering, suppression, and combining.

The thalamus service 33000 may be a gateway for all communication that responds to the prioritization of the control system 33002. The control system 33002 may decide to change the prioritization of the data streamed from the thalamus service 33000, for example, during a known fire in an isolated area, and the event may direct the thalamus service 33000 to continue to provide flame sensor information despite the fact that majority of this data is not unusual. The thalamus service 33000 may be an integral part of the overall system communication framework.

In embodiments, the thalamus service 33000 includes an intake management system 33006. The intake management system 33006 may be configured to receive and process multiple large datasets by converting them into data streams that are sized and organized for subsequent use by a central control system 33002 operating within one or more systems. For example, a robot may include vision and sensing systems that are used by its central control system 33002 to identify and move through an environment in real time. The intake management system 33006 can facilitate robot decision-making by parsing, filtering, classifying, or otherwise reducing the size and increasing the utility of multiple large datasets that would otherwise overwhelm the central control system 33002. In embodiments, the intake management system may include an intake controller 33008 that works with an intelligence service 33010 to evaluate incoming data and take actions-based evaluation results. Evaluations and actions may include specific instruction sets received by the thalamus service 33000, for example the use of a set of specific compression and prioritization tools stipulated within a "Networking" library module. In another example, thalamus service inputs may direct the use of specific filtering and suppression techniques. In a third example, thalamus service inputs may stipulate data filtering associated with an area of interest such as a certain type of financial transaction. The intake management system is also configured to recognize and manage datasets that are in a vectorized format such as PCMP, where they may be passed directly to central control, or alternatively deconstructed and processed separately. The intake management system 33006 may include a learning module that receives data from external sources that enables improvement and creation of application and data management library modules. In some cases, the intake management system may request external data to augment existing datasets.

In embodiments the control system 33002 may direct the thalamus service 33000 to alter its filtering to provide more input from a set of specific sources. This indication more input is handled by the thalamus service 33000 by suppressing other information flows based to constrain the total data flows to within a volume the central control system can handle.

The thalamus service 33000 can operate by suppressing data based on several different factors, and in embodiments, the default factor maybe unusualness of the data. This unusualness is a constant monitoring of all input sensors and determining the unusualness of the data.

In some embodiments, the thalamus service 33000 may suppress data based on geospatial factors. The thalamus service 33000 may be aware of the geospatial location of all sensors and is able to look for unusual patterns in data based on geospatial context and suppress data accordingly.

In some embodiments, the thalamus service 33000 may suppress data based on temporal factors. Data can be suppressed temporally, for example, if the cadence of the data can be reduced such that the overall data stream is filtered to level that can be handled by the central processing unit.

In some embodiments, the thalamus service 33000 may suppress data based on contextual factors. In embodiments, context-based filtering is a filtering event in which the thalamus service 33000 is aware of some context-based event. In this context the filtering is made to suppress information flows not relating to the data from the event.

In embodiments, the control system 33002 can override the thalamus filtering and decide to focus on a completely different area for any specific reason.

In embodiments, the system may include a vector module. In embodiments, the vector module may be used to convert data to a vectorized format. In many examples, the conversion of a long sequence of oftentimes similar numbers into a vector, which may include short term future predictions, makes the communication both smaller in size and forward looking in nature. In embodiments, forecast methods may include: moving average; weighted moving average; Kalman filtering; exponential smoothing; autoregressive moving average (ARMA) (forecasts depend on past values of the variable being forecast, and on past prediction errors); autoregressive integrated moving average (ARIMA) (ARMA on the period-to-period change in the forecasted variable); extrapolation; linear prediction; trend estimation (predicting the variable as a linear or polynomial function of time); growth curve (e.g., statistics); and recurrent neural network.

In embodiments, the system may include a predictive model communication protocol (PMCP) system to support vector-based predictive models and a predictive model communication protocol (PMCP). Under the PMCP protocol, instead of traditional streams where individual data items are transmitted, vectors representing how the data is changing or what is the forecast trend in the data is communicated. The PMCP system may transmit actual model parameters and receiving units such that edge devices can apply the vector-based predictive models to determine future states. For example, each automated device in a network could train a regression model or a neural network, constantly fitting the data streams to current input data. All automated devices leveraging the PMCP system would be able to react in advance of events actually happening, rather than waiting for depletion of inventory for an item, for example, to occur. Continuing the example, the stateless automated device can react to the forecast future state and make the necessary adjustments, such as ordering more of the item.

In embodiments, the PMCP system enables communicating vectorized information and algorithms that allow vectorized information to be processed to refine the known information regarding a set of probability-based states. For example, the PMCP system may support communicating the vectorized information gathered at each point of a sensor reading but also adding algorithms that allow the information to be processed. Applied in an environment with large numbers of sensors with different accuracies and reliabilities, the probabilistic vector-based mechanism of the PMCP system allows large numbers, if not all, data streams to combine to produce refined models representing the current state, past states and likely future states of goods. Approximation methods may include importance sampling, and the resulting algorithm is known as a particle filter, condensation algorithm, or Monte Carlo localization.

In embodiments, the vector-based communication of the PMCP system allows future security events to be anticipated, for example, by simple edge node devices that are running in a semi-autonomous way. The edge devices may be responsible for building a set of forecast models showing trends in the data. The parameters of this set of forecast models may be transmitted using the PMCP system.

Security systems are constantly looking for vectors showing change in state, as unusual events tend to trigger multiple vectors to show unusual patterns. In a security setting, seeing multiple simultaneous unusual vectors may trigger escalation and a response by, for example, the control system. In addition, one of the major areas of communication security concern is around the protection of stored data, and in a vector-based system data does not need to be stored, and so the risk of data loss is simply removed.

In embodiments, PMCP data can be directly stored in a queryable database where the actual data is reconstructed dynamically in response to a query. In some embodiments, the PMCP data streams can be used to recreate the fine-grained data so they become part of an Extract Transform and Load (ETL) process.

In embodiments where there are edge devices with very limited capacities, additional edge communication devices can be added to convert the data into PMCP format. For example, to protect distributed medical equipment from hacking attempts many manufacturers will choose to not connect the device to any kind of network. To overcome this limitation, the medical equipment may be monitored using sensors, such as cameras, sound monitors, voltage detectors for power usage, chemical sniffers, and the like. Functional unit learning and other data techniques may be used to determine the actual usage of the medical equipment detached from the network functional unit.

Communication using vectorized data allows for a constant view of likely future states. This allows the future state to be communicated, allowing various entities to respond ahead of future state requirements without needing access to the fine-grained data.

In embodiments, the PMCP protocol can be used to communicate relevant information about production levels and future trends in production. This PMCP data feed, with its built-in data obfuscation allows real contextual information about production levels to be shared with consumers, regulators, and other entities without requiring sensitive data to be shared. For example, when choosing to purchase a new car, if there is an upcoming shortage of red paint then the consumer could be encouraged to choose a different color in order to maintain a desired delivery time. PMCP and vector data enables simple data informed interactive systems that user can apply without having to build enormously complex big data engines. As an example, an upstream manufacturer has an enormously complex task of coordinating many downstream consumption points. Through the use of PMCP, the manufacturer is able to provide real information to consumers without the need to store detailed data and build complex models.

In embodiments, edge device units may communicate via the PMCP system to show direction of movement and likely future positions. For example, a moving robot can communicate its likely track of future movement.

In embodiments, the PMCP system enables visual representations of vector-based data (e.g., via a user interface), highlighting of areas of concern without the need to process enormous volumes of data. The representation allows for the display of many monitored vector inputs. The user interface can then display information relating to the key items of interest, specifically vectors showing areas of unusual or troublesome movement. This mechanism allows sophisticated models that are built at the edge device edge nodes to feed into end user communications in a visually informative way.

Functional units produce a constant stream of "boring" data. By changing from producing data, to being monitored for problems, issues with the logistical modules are highlighted without the need for scrutiny of fine-grained data. In embodiments, the vectorizing process could constantly manage a predictive model showing future state. In the context of maintenance, these changes to the parameters in the predictive model are in and of themselves predictors of change in operational parameters, potentially indicating the need for maintenance. In embodiments, functional areas are not always designed to be connected, but by allowing for an external device to virtually monitor devices, functional areas that do not allow for connectivity can become part of the information flow in the goods. This concept extends to allow functional areas that have limited connectivity to be monitored effectively by embellishing their data streams with vectorized monitored information. Placing an automated device in the proximity of the functional unit that has limited or no connectivity allows capture of information from the devices without the requirement of connectivity. There is also potential to add training data capture functional units for these unconnected or limitedly connected functional areas. These training data capture functional units are typically quite expensive and can provide high quality monitoring data, which is used as an input into the proximity edge device monitoring device to provide data for supervised learning algorithms.

Oftentimes, locations are laden with electrical interference, causing fundamental challenges with communications. The traditional approach of streaming all the fine-grained data is dependent on the completeness of the data stream. For example, if an edge device was to go offline for 10 minutes, the streaming data and its information would be lost. With vectorized communication, the offline unit continues to refine the predictive model until the moment when it reconnects, which allows the updated model to be transmitted via the PMCP system.

In embodiments, systems and devices may be based on the PMCP protocol. For example, cameras and vision systems (e.g., liquid lens systems), user devices, sensors, robots, smart containers, and the like may use PMCP and/or vector-based communication. By using vector-based cameras, for example, only information relating to the movement of items is transmitted. This reduces the data volume and by its nature filters information about static items, showing only the changes in the images and focusing the data communication on elements of change. The overall shift in communication to communication of change is similar to how the human process of sight functions, where stationary items are not even communicated to the higher levels of the brain.

Radio Frequency Identification allows for massive volumes of mobile tags to be tracked in real-time. In embodiments, the movement of the tags may be communicated as vector information via the PMCP protocol, as this form of communication is naturally suited to handing information regarding the location of tag within the goods. Adding the ability to show future state of the location using predictive models that can use paths of prior movement allows the goods to change the fundamental communication mechanism to one where units consuming data streams are consuming information about the likely future state of the goods. In embodiments, each tagged item may be represented as a probability-based location matrix showing the likely probability of the tagged item being at a position in space. The communication of movement shows the transformation of the location probability matrix to a new set of probabilities. This probabilistic locational overview provides for constant modeling of areas of likely intersection of moving units and allows for refinement of the probabilistic view of the location of items. Moving to a vector-based probability matrix allows units to constantly handle the inherent uncertainty in the measurement of status of various items, entities, and the like. In embodiments, status includes, but is not limited to, location, temperature, movement and power consumption.

In embodiments, continuous connectivity is not required for continuous monitoring of sensor inputs in a PMCP-based communication system. For example, a mobile robotic device with a plurality of sensors will continue to build models and predictions of data streams while disconnected from the network, and upon reconnection, the updated models are communicated. Furthermore, other systems or devices that use input from the monitored system or device can apply the best known, typically last communicated, vector predictions to continue to maintain a probabilistic understanding of the states of the goods.

Deployment

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions, or other types of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor, and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams, or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above, and combinations thereof, may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f). The term "set" as used herein refers to a group having one or more members.

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other types of processor. The processor may be or may include a signal processor, digital processor, data processor, embedded processor, microprocessor, or any variant such as a co-processor (math co-processor, graphic co-processor, communication co-processor, video co-processor, AI co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, network-attached storage, server-based storage, and the like.

A processor may include one or more cores that may enhance speed and performance of a multiprocessor. In embodiments, the process may be a dual core processor, quad core processors, other chip-level multiprocessor and the like that combine two or more independent cores (sometimes called a die).

The methods and systems described herein may be deployed in part or in whole through a machine that executes computer software on a server, client, firewall, gateway, hub, router, switch, infrastructure-as-a-service, platform-as-a-service, or other such computer and/or networking hardware or system. The software may be associated with a server that may include a file server, print server, domain server, internet server, intranet server, cloud server, infrastructure-as-a-service server, platform-as-a-service server, web server, and other variants such as secondary server, host server, distributed server, failover server, backup server, server farm, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (Saas), platform as a service (PaaS), and/or infrastructure as a service (IaaS).

The methods, program codes, and instructions described herein and elsewhere may be implemented on a cellular network with multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 5G, LTE, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, network-attached storage, network storage, NVME-accessible storage, PCIE connected storage, distributed storage, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable code using a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices, artificial intelligence, computing devices, networking equipment, servers, routers, and the like. Furthermore, the elements depicted in the flow chart and block diagrams, or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions. Computer software may employ virtualization, virtual machines, containers, dock facilities, portainers, and other capabilities.

Thus, in one aspect, methods described above, and combinations thereof, may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "with," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. The term "set" may include a set with a single member. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference as if fully set forth herein.

What is claimed is:

1. A system for executing blockchain transactions on behalf of an enterprise, the system comprising:

one or more processors; and a computer-readable medium that stores a set of executable instructions that, when executed by the one or more processors, cause the system to perform operations comprising:

assigning a plurality of digital assets of the enterprise to a plurality of digital wallets associated with the enterprise such that each digital asset is assigned to a respective digital wallet of the plurality of digital wallets;

receiving, at a graphical user interface configured to manage access to the plurality of digital wallets associated with the enterprise, input indicating respective permissions for each digital wallet, wherein the respective permissions for each digital wallet designate a respective plurality of users that are granted access to the digital wallet;

receiving a request to access the graphical user interface, wherein the request is initiated by a user device associated with a user;

selecting a set of digital wallets that the user is allowed to access based on the respective permissions for each digital wallet;

configuring the graphical user interface to grant the user access to a set of wallet-based functions of the set of digital wallets, wherein the set of digital wallets comprises multiple digital wallets, wherein the graphical user interface is further configured to prevent the user from accessing a different set of wallet-based functions;

receiving a transaction request initiated by the user device associated with the user, the transaction request requesting a blockchain transaction with a blockchain address associated with a third party and having a set of attributes corresponding to the requested blockchain transaction;

selecting a digital wallet of the set of digital wallets to execute the blockchain transaction based on the set of attributes;

initiating an interaction workflow from a set of workflows based on the selected digital wallet;

obtaining the blockchain address associated with the third party;

obtaining a trust score from a decentralized trust network that analyzes blockchain data to determine a likelihood of fraud based on the blockchain address, wherein the trust score indicates the likelihood of fraud;

determining whether to allow the blockchain transaction using the selected digital wallet based on the trust score;

and in response to determining to allow the blockchain transaction, initiating execution of the blockchain transaction using the selected digital wallet.

2. The system of claim 1, wherein the operations further comprise verifying that the user is authorized to initiate execution of the blockchain transaction based on a role of the user and one or more interaction attributes.

3. The system of claim 2, wherein the operations further comprise transmitting a trust score request to a blockchain node, wherein the request indicates the blockchain address associated with the third party, wherein the operations further comprise receiving the trust score from the blockchain node.

4. The system of claim 3, wherein the trust score request indicates a decentralized network of node computing devices comprising the blockchain node that implement the decentralized trust network.

5. The system of claim 4, wherein the trust score is a consensus trust score that is based on local trust scores independently determined by respective node computing devices of the decentralized network of node computing devices.

6. The system of claim 3, wherein the operations further comprise determining, based on the interaction workflow, to execute the blockchain transaction in response to verifying that the user is authorized to initiate execution of the blockchain transaction and the trust score exceeding a trust threshold.

7. The system of claim 1, wherein in response to execution of the blockchain transaction, the operations further comprise generating a transaction record and storing the transaction record on a second blockchain.

8. The system of claim 7, wherein the second blockchain is a private blockchain maintained by the enterprise.

9. The system of claim 1, wherein the operations further comprise managing a set of private and public keys on behalf of the enterprise.

10. The system of claim 1, wherein obtaining the trust score from the decentralized trust network that analyzes blockchain data to determine the likelihood of fraud based on the blockchain address comprises:

transmitting a payment of a utility token for work performed to determine the trust score to a first blockchain node; and receiving the trust score from a second blockchain node device that determined the trust score.

11. A computer-implemented method for executing user-initiated blockchain transactions in trustless environments on behalf of an enterprise having a plurality of different users, the method comprising:

assigning a plurality of digital assets of the enterprise to a plurality of digital wallets associated with the enterprise such that each digital asset is assigned to a respective digital wallet of the plurality of digital wallets;

receiving, at a graphical user interface configured to manage access to the plurality of digital wallets associated with the enterprise, input indicating respective permissions for each digital wallet that designate a respective plurality of users that are granted access to the respective digital wallet;

receiving a request to access the graphical user interface, wherein the request is initiated by a user device associated with a user;

selecting a set of digital wallets that the user is allowed to access based on the respective permissions for each digital wallet;

configuring the graphical user interface to grant the user access to a set of wallet-based functions of the set of digital wallets, wherein the set of digital wallets comprises multiple digital wallets, wherein the graphical user interface is further configured to prevent the user from accessing a different set of wallet-based functions;

receiving a transaction request initiated by the user device associated with the user, the transaction request requesting a blockchain transaction with a blockchain address associated with a third party and having a set of attributes corresponding to the requested blockchain transaction;

selecting a digital wallet of the set of digital wallets to execute the blockchain transaction based on the set of attributes; and the blockchain address associated with the third party;

obtaining a trust score from a decentralized trust network that analyzes blockchain data to determine a likelihood of fraud based on the blockchain address, wherein the trust score indicates the likelihood of fraud;

determining whether to allow the blockchain transaction using the selected digital wallet based on the trust score; and in response to determining to execute the blockchain transaction, initiating execution of the blockchain transaction from using the selected digital wallet.

12. The method of claim 11, further comprising that the user is authorized to initiate execution of the blockchain transaction based on a role of the user and one or more interaction attributes.

13. The method of claim 12, further comprising:

providing a trust score request to a blockchain node, wherein the request indicates the blockchain address associated with the third party; and receiving the trust score from the blockchain node.

14. The method of claim 13, wherein the trust score request indicates a decentralized network of node computing devices comprising the blockchain node that implement the decentralized trust network.

15. The method of claim 14, wherein the trust score is a consensus trust score that is based on local trust scores independently determined by respective node computing devices of the decentralized network of node computing devices.

16. The method of claim 13, further comprising determining to allow the blockchain transaction in response to verifying that the user is authorized to perform the blockchain transaction and the trust score exceeding a trust threshold.

17. The method of claim 11, further comprising, in response to execution of the blockchain transaction, generating an interaction record and storing the interaction record on a second blockchain.

18. The method of claim 17, wherein the second blockchain is a private blockchain maintained by the enterprise.

19. The method of claim 11, further comprising managing a set of private and public keys on behalf of the enterprise.

20. The method of claim 11, wherein obtaining the trust score from the decentralized trust network that analyzes blockchain data to determine the likelihood of fraud based on the blockchain address comprises:

transmitting a payment of a utility token for work performed to determine the trust score to a first blockchain node; and receiving the trust score from a second blockchain node device that determined the trust score.

* * * * *